United States Patent [19]

Hall et al.

[11] Patent Number: 4,720,778

[45] Date of Patent: Jan. 19, 1988

[54] SOFTWARE DEBUGGING ANALYZER

[75] Inventors: Kevin M. Hall, Daniel A. Schmelzer, both of Colorado Springs, Colo.

[73] Assignee: Hewlett Packard Company, Palo Alto, Calif.

[21] Appl. No.: 699,781

[22] Filed: Feb. 5, 1985

[51] Int. Cl.[4] ........................ G06F 11/30; G06F 11/34

[52] U.S. Cl. ........................ 364/200

[58] Field of Search ... 364/200 MS File, 900 MS File, 364/300 MS File

[56] References Cited

U.S. PATENT DOCUMENTS

| | | | |
|---|---|---|---|
| 4,338,660 | 7/1982 | Kelley et al. | 364/200 |
| 4,503,495 | 3/1985 | Boudreau | 364/200 |
| 4,511,960 | 4/1985 | Boudreau | 364/200 |
| 4,631,701 | 12/1986 | Kappeler et al. | 364/900 |

*Primary Examiner*—David Y. Eng

[57] ABSTRACT

A software debugging analyzer nonintrusively acquires data concerning the execution of software on a real-time basis. Low-level event recognition is accomplished with programmable comparators, whose outputs are fed to high-level recognition comparators to define complex events. Dynamic recognition is provided by recognition cmparators programmable on a real time basis as variables are actuated. Acquired data is stored in memory in either a sequential or random access mode. A microprocessor translates high level commands into event constructs and processes the acquired data into a format suitable for display to a user.

2 Claims, 14 Drawing Figures

SOFTWARE DEBUGGING ANALYZER

BACKGROUND AND SUMMARY OF THE INVENTION

An increasing number of products are incorporating microprocessors. Much of the development cost of these products is related to the testing and debugging of the programs executed by the microprocessor. Also, the performance of the resulting product may depend heavily upon the various design choices made and the skill employed in writing those programs. That programming may be in the form of firmware or software; as far as the description below is concerned the difference is moot, and such programming will hereinafter be referred to simply as software.

Any new product that relies heavily on software to accomplish its intended function goes through a development cycle during which designers depend on a variety of measurement tools (e.g., emulators, timing analyzers, logic state analyzers and the like) to test, debug, and analyze the product's performance. The instant invention is an additional measurement tool that aids designers in nearly every phase of the software development cycle. It can be used for software characterization, testing debugging, and optimization, and can characterize software nonintrusively as that software executes in real time.

Traditionally, program performance has been measured in one of two ways: through in-program "hooks," which print out a short message every time the block of code in which they reside is executed, or by custom designed monitoring programs, which oversee the execution of the target code and measure the duration of execution. The main drawback of both traditional methods is that they are intrusive and affect real-time operation. In-program hooks lengthen the program under test and must be removed if the finished code is to fit in a restricted memory space. Once removed, however, they are no longer available to monitor code execution. Therefore, for every debugging effort the hooks must be regenerated; a difficult and costly task. Similarly, program monitors, whether they be line-by-line tracers or event timers, add their own execution time to that of the program. As a consequence, they are not well suited to situations that require real detective work across a wide spectrum of module interaction. A further disadvantage of these traditional methods is that they must be specifically tailored to each measurement to be performed, a time consuming and possibly error prone programming task in itself.

Traditional methods suffered another disadvantage in that they are not well suited to debugging or analyzing programs written in high level languages such as C and PASCAL. The programmer must do several hierarchy translations to bridge the gap between the language in which the program is designed and the raw state flow level in which the analyzer is operated. The result is that the programmer has to think through the testing and debugging procedure in a different context from that in which the basic program was conceptualized and implemented.

In contrast, the software debugging analyzer disclosed herein performs real-time nonintrusive measurements. It greatly reduces the mismatch between the analyses and debugging capabilities of the measurement system and the level at which the program to be analyzed was conceptualized and implemented.

The debugging analyzer disclosed herein provides increases in the automation of software testing and debugging at three levels: automation of the software hierarchy translation; automation of the basic test and debug measurements; and automation of a series or sequence of measurements.

Data collection parameters are entered quickly and easily with directed-syntax softkeys. Symbols and labels generated in program assembly or compilation can be used directly in defining measurements. Measurement configurations are flexible, meeting a variety of application requirements. The debugging analyzer includes basic performance measurement capabilities, providing for testing of module/program timing and code execution specifications. These performance measurement capabilities are fundamental to aid the user's verification and validation activities for improved software reliability, as well as in the basic debug process. Timing measurements provide important improvements in the debug effort, opening up a third dimension to the user to provide a more comprehensive picture of the system being analyzed. Also, the performance metrics of the analyzer allow the user to accomplish performance analysis and code optimization activities. (E.g., not meeting a timing, occurrence, or space specification is a bug.) The software code and data measurement capabilities provide significant improvements to programmer productivity over present debug and analysis packages. All these measurements can be accessed via a highly leveraged automatic test management capability. And of extreme importance to improved accuracy and reduced uncertainty of these measurements, is the nonintrusive and real-time implementation of this instrumentation. These resources are presented to the user in an easy-to-use implementation, which is in alignment with the way software solutions are conceptualized, designed, implemented and maintained.

These and other aspects of the invention are achieved by a hybrid design with an optimized balance between hardware and software implementation, using hardware to provide real-time data acquisition, speed and nonintrusive measurement, and software to provide a flexible feature set.

DESCRIPTION OF THE PREFERRED EMBODIMENT

Figure 1:
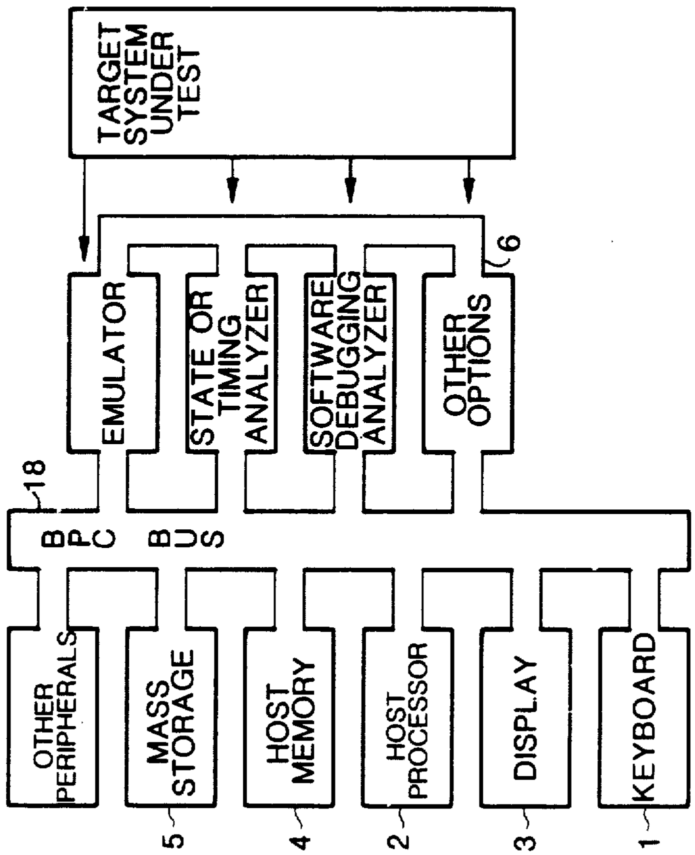
FIG. 1 is a simplified block diagram of a microprocessor development system which illustrates the connection of the invention to a host system when the invention is configured as a plug-in option.

FIG. 1 is a block diagram of a "microprocessor development system" that includes a keyboard 1 with a row of re-definable "soft keys" adjacent a CRT display 3. The apparatus also includes a host processor 2, memory 4 and a mass storage facility 5 (e.g., a hard disc drive) and is capable of receiving an extensive collection of options. Each option has one or more printed circuit boards that are interconnected with the host components via BPC bus 18. Generally each option also has some associated software which augments to an operating and measurement system already resident in the host system.

Among the options that may be installed in the microprocessor development system are emulators, cross compilers, logic state analyzers, timing analyzers, and the subject of the instant disclosure, a software debugging analyzer. The options are interconnected via intermodule bus 6. It will, of course, be understood by those skilled in the art that the invention need not be produced as an option to some other apparatus, but may equally well be implemented as a complete stand-alone measurement device, if desired. Nevertheless, since the invention was first produced as such an option, it will, as a matter of convenience, be described in that form.

In the present embodiment the software debugging analyzer consists of three p.c. boards and some accompanying software that are installed in the microprocessor development system. In one particular actual embodiment where the apparatus is a Hewlett-Packard model 64000 an emulator option must also be installed. In that case the connections for the plug-in p.c. boards are arranged so that the necessary signals from the target system under test are automatically coupled to the software debugging analyzer as the target software is executed with the emulator.

It would, of course, be equally possible to equip the software debugging analyzer with its own probes as well as signal acquisition and conditioning circuitry, so that it could be attached directly to an arbitrary processor executing the target software. While that would have certain advantages pertaining to flexibility, the scheme of automatic coupling to an emulator has the equally attractive advantage of allowing software performance analysis to proceed even before the hardware of the target system is complete.

Once the software debugging analyzer is installed and accessed, various re-definable definitions appear at the bottom of the CRT display. These definitions are associated with the row of re-definable soft keys. With the aid of these keys the user instructs the apparatus and its various options (including the software debugging analyzer in particular) concerning the measurements that are desired. This is accomplished via an interactive process involving "directed syntax," wherein the operating and measurement system dynamically varies the definitions of the soft keys as the user proceeds through the syntax of each command. In this way the user is continually presented with only valid choices, and is automatically instructed and guided in his selection of parameters for the various commands. In response to his commands the operating and measurement system writes various control values into registers in the option p.c. boards and elsewhere. That configures those elements of hardware to operate in the modes selected and to perform the desired measurements.

Figure 2:
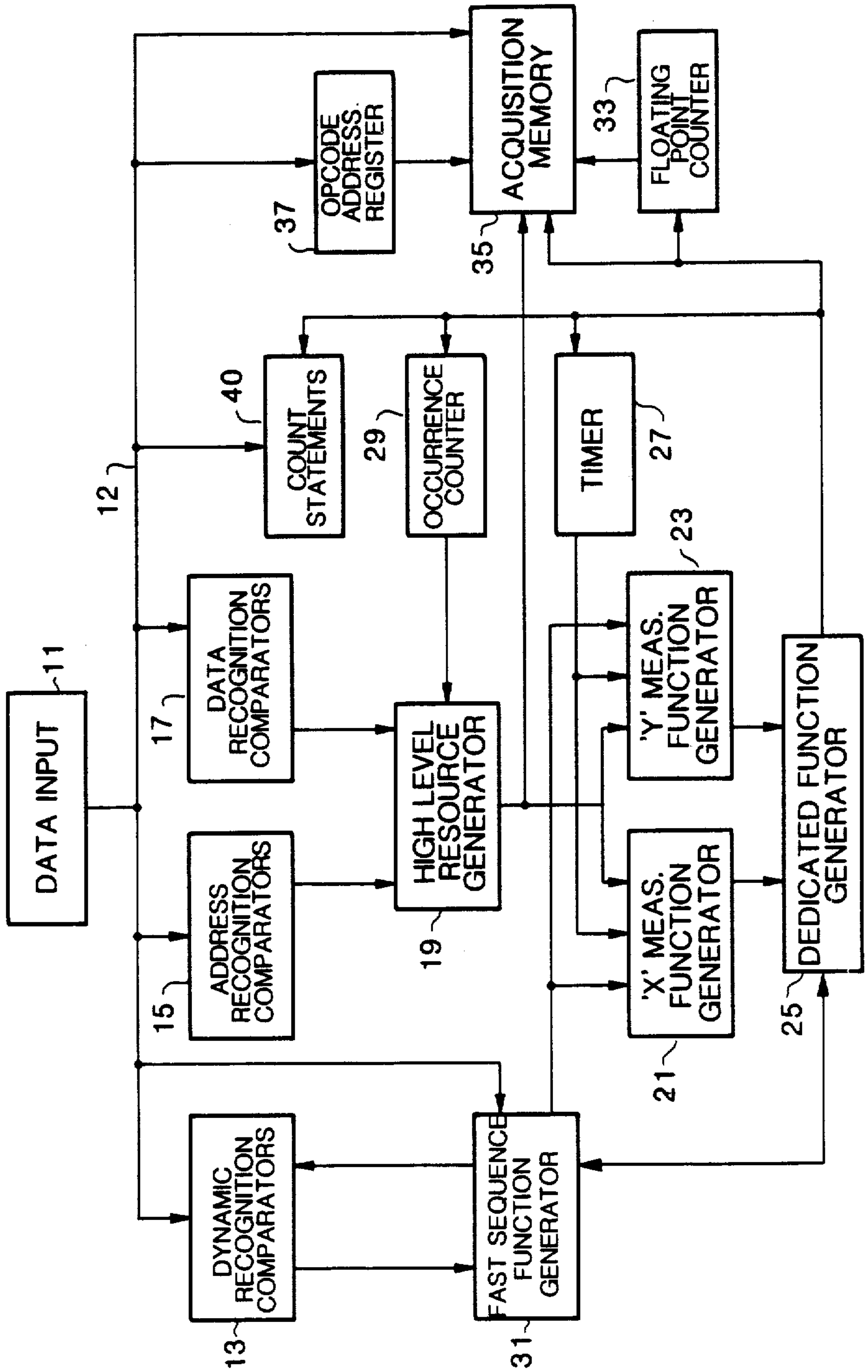
FIG. 2 is a simplified block diagram of the information flow in the system of the invention.

FIG. 2 illustrates the information flow in the analyzer. Signals from the target system under test enter the software debugging analyzer via data input 11 to emulation bus 12. The input signals include address, data and status information from the target system. The address and status signals, which comprise 32 bits, are sent to dynamic recognition comparators 13 and address recognition comparators 15 and fast sequence generator 31. The data signals, which comprise 16 bits, are sent to data recognition comparators 17. The address, status and data signals also go to the acquisition memory 35 for selective storage as described below.

The address recognition comparators 15 are programmable to recognize target system signals which represent an event of interest in carrying out the chosen debugging analysis routine, i.e., whether a particular address or status is the same as or within a range of those chosen by the user. Similarly, the data recognition comparators 17 are programmable to recognize the target system data signals which are equal to or within a range of those chosen by the user.

The outputs from the address and data recognition comparators go to high level resource generator 19. The high level resource generator is programmable to determine the occurrence of a number of more complex events, i.e., combinations of multiple events recognized by the address and data recognition comparators.

The address and data recognition comparators and the high level resource generator thus provide two levels of event recognition logic. The flexibility of the event recognition circuits is thereby increased because low-level events and complex combinations of elementary events can be programmed separately. This also allows the low-level events recognition to be programmed more simply, because an event may be defined as a single address, status or data stream rather than a combination of them. A further advantage is that the output of high level resource generator 19 has a relatively high density of information, thus the next level of recognition logic can be used to perform more complex analyses.

The outputs of high level resource generator 19 go to two sequencers, X measurement function generator 21 and Y measurement function generator 23. These function generators are programmable to determine the occurrence of a sequence of the events represented by the outputs of high level resource generator 19. Additional inputs to function generators 21 and 23 come from timer 27 and fast sequence function generator 31, whose operation is described below. These additional inputs can also be employed in defining a sequence of events to be recognized.

The outputs of function generators 21 and 23 are sent to dedicated function generator 25, to produce any of a number of operating functions. Included are: start, timer count, timer load, occur, count, store, stop and search. The start function initiates a measurement episode and enables the other functions. Timer count and timer load control timer 27. The occur function is used to provide input to occurrence counter 29 which counts selected events for high level resource generator 19. The count function is used for input to floating point counter 33 whose output can be stored in acquisition memory 35 and as input to line counter 45 for counting line execution. The store function stores in acquisition memory 35 the address, data and status information currently on emulation bus 12, as well as the current value in floating point counter 33 and the current value in opcode address register 37. The stop function terminates a measurement episode. The search function is used for driving signals to external apparatus in the host system such as the other analyzers.

To summarize the operation of the event recognition system described so far: low-level event recognition is done by address and data recognition comparators 15 and 17; high-level event recognition—complex event definitions—is done by high level resource generator 19, and sequences of complex events are examined by function generators 21 and 23 to decide when a function is to be carried out by dedicated function generator 25. Timer 27 and occurrence counter 29 are controlled by dedicated function generator 25 and provide feedback input to high level resource generator 19 and measurement function generators 21 and 23.

The portion of the event recognition system shown on the left hand side of FIG. 2, comprising dynamic recognition comparators 13 and fast sequence function generator 31, provides for recognition of events which involve dynamically activated variables. Typically, variables are assigned a memory location, or address, and any activity with respect to a variable can be tracked by watching that address. However, in some high-level programming languages, e.g., PASCAL, a variable may be assigned only a relative location, for example, a location relative to the top of a stack of local variables. In order to trace any activity with respect to such dynamically activated variables, the analyzer must keep track of where the top of the stack is and where the variable is located in the stack.

The dynamic recognition comparators 13 are programmable in real-time to recognize target system signals which represent the activation of variables and the stack location assigned to them. Fast sequence function generator 31 is programmable to interpret the output signals from the dynamic recognition comparators 13 and reprogram at least one of the dynamic comparators with the address range assigned to the dynamically activated variable. The outputs of fast sequence function generator 31 go to X and Y measurement function generators 21 and 23 and to dedicated function generator 25. Thus, when a dynamic comparator 13 detects access to a dynamic variable fast sequence function generator 31 can cause the current state on emulation bus 12 to be stored in acquisition memory 35.

The count statements circuit 40 counts the occurrences of a high level language instruction, based on signals received from the dedicated function generator 25 and from emulation bus 12.

Figure 3A:
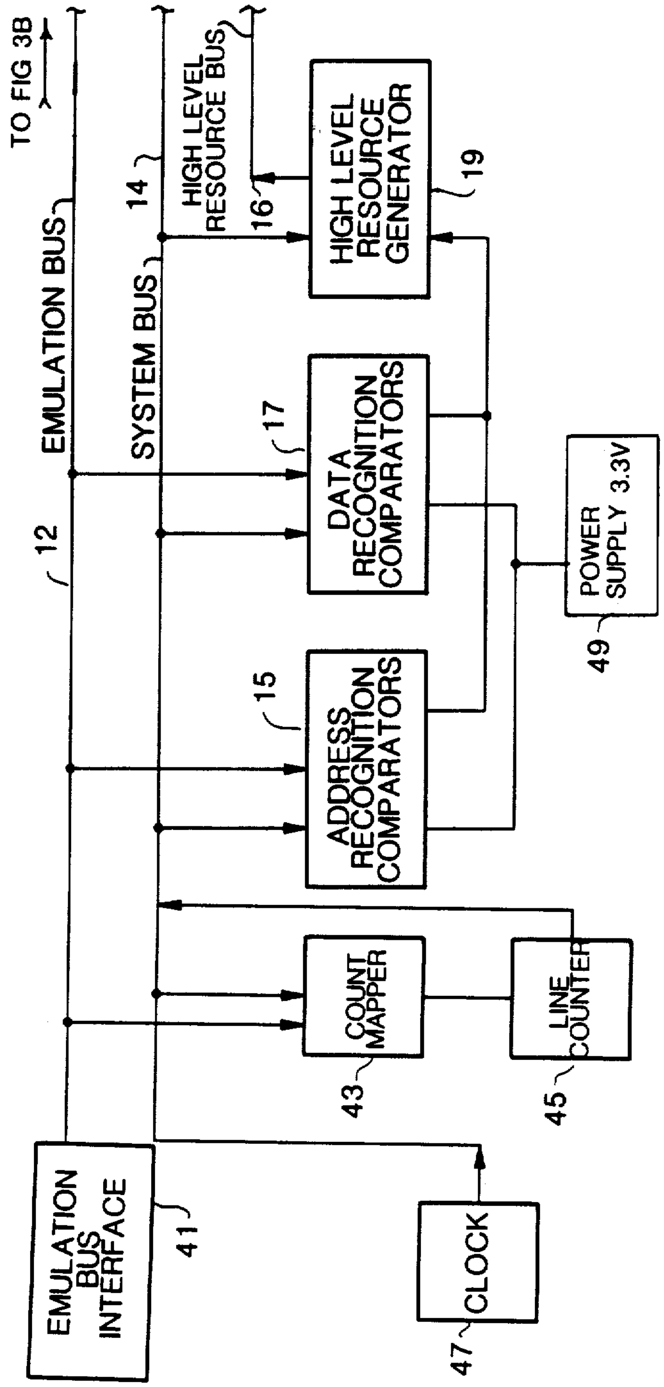
FIGS. 3A, 3B and 3C are simplified block diagrams of the set of printed circuit boards incorporating the invention when configured as a plug-in option to the host system as illustrated in FIG. 1.
Figure 3B:
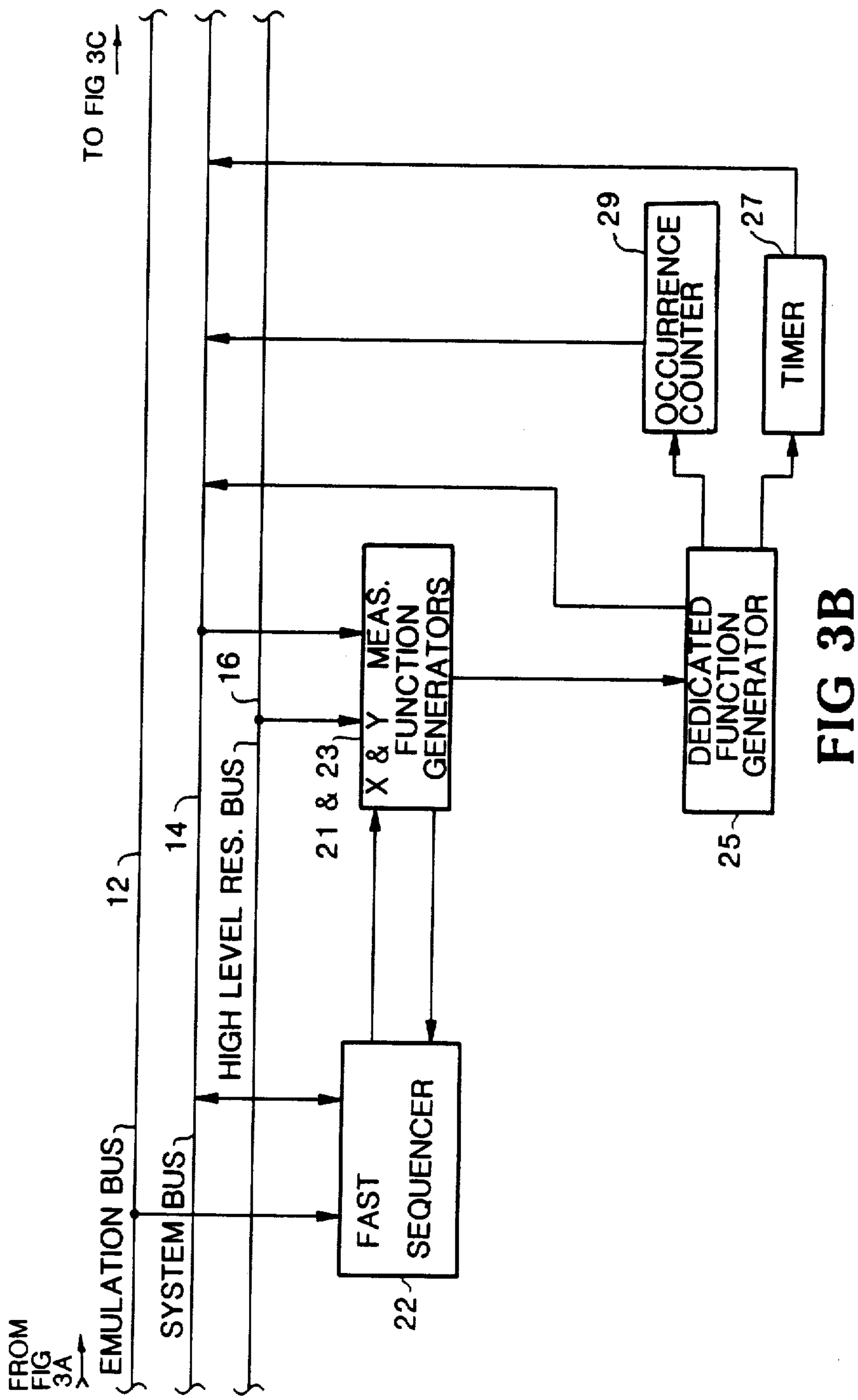
Figure 3C:
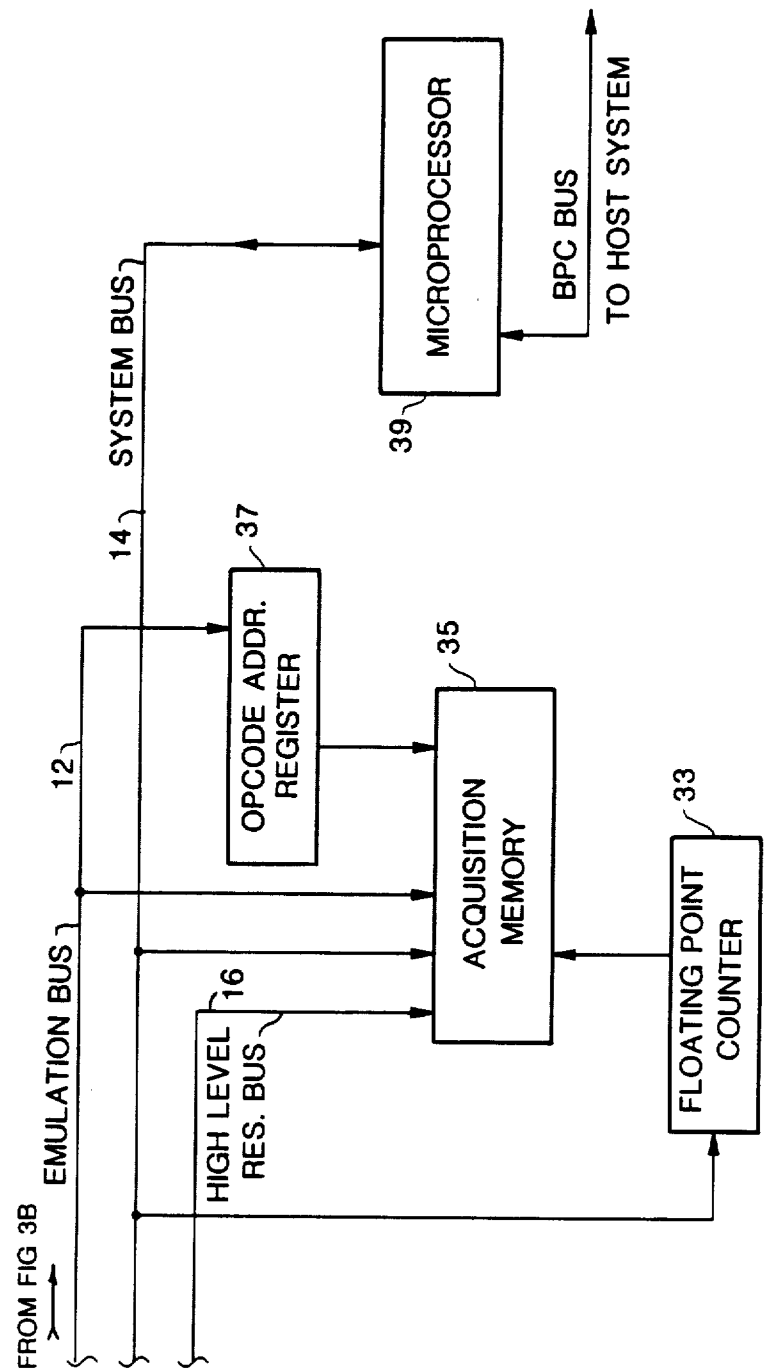

In the particular embodiment described herein, the software debugging analyzer is contained on three interconnected p.c. boards which are inserted into the host microprocessor development system. FIGS. 3A, 3B and 3C illustrate schematically the layout of circuitry on the three p.c. boards.

Referring to FIG. 3A, the first p.c. board contains emulation bus interface 41 address recognition comparators 15, data recognition comparators 17, high level resource generator 19, count mapper 43 and line counter 45, clock 47 and power supply 49.

Emulation bus interface 41 provides an input port through which signals from the emulator enter the software debugging analyzer. The signals from the emulator are distributed to the appropriate circuits throughout the analyzer via emulation bus 12.

Figure 4:
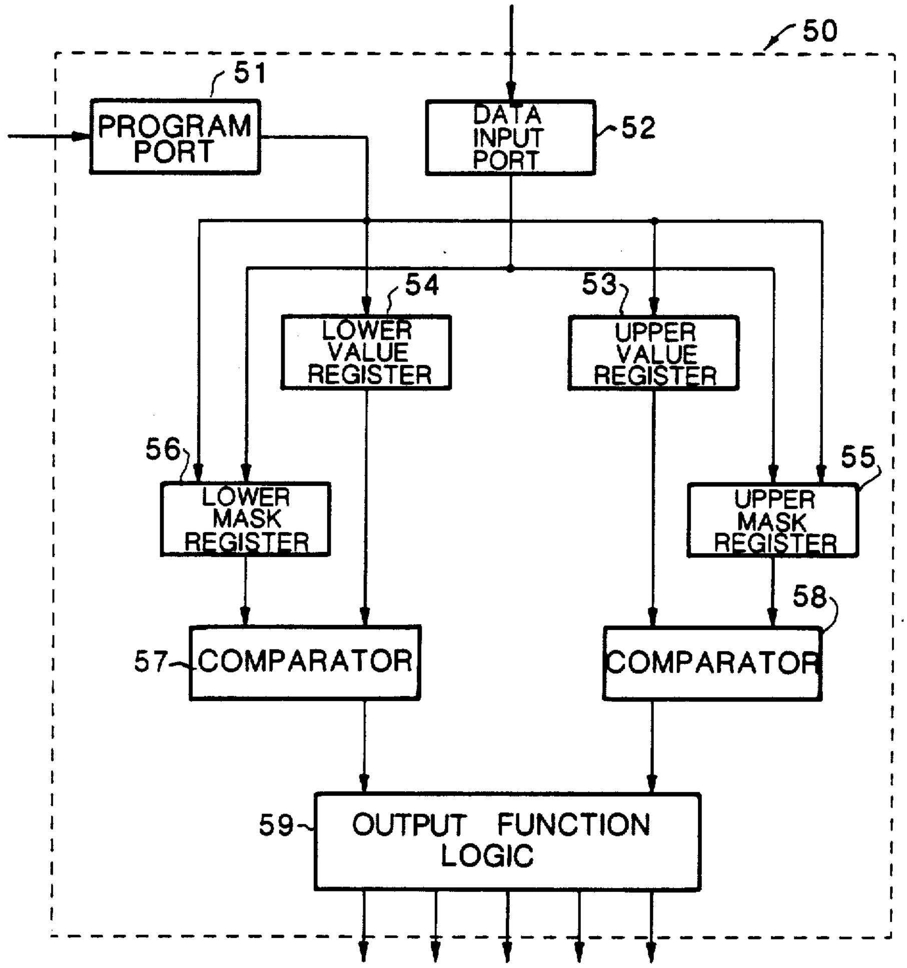
FIG. 4 is a simplified block diagram which illustrates the components of a recognition comparator circuit used in the invention.

The address recognition comparators 15 and the data recognition comparators 17 are 32-bit comparators. FIG. 4 shows a schematic block diagram of the components of the recognition comparators. The function of each comparator circuit 50 is to perform pattern and range recognition in a 1, 0, "don't care" manner on input data. Signals received at the program port 51 direct the 32-bit pattern received on the program input port 51 to one of four registers within the comparator. Each comparator has four 32-bit wide registers, an upper bound value register 53, a lower bound value register 54, an upper bound mask register 55 and a lower bound mask register 56. All of the registers can be loaded on the fly, although the mask registers 55 and 56 in address and data recognition comparators 15 and 17 are typically loaded before a measurement is made and not altered during the measurement. The upper and lower bound value registers 53 and 54 and the upper and lower bound mask registers 55 and 56 are loaded with the configuration of the data or address event to be recognized. Input data received via the emulator bus 12 through data input port 52 is compared with the configurations loaded into the mask and value registers. The outputs of the upper boundary value and mask registers are sent to comparator 57 to determine if the input value is less than or equal to, or just equal to, the event data. The outputs of the lower boundary value and mask registers are sent to comparator 58 to determine if the input value is greater than or equal to, or just equal to the event data.

Based on the output signals from comparators 57 and 58, output function logic 59 provides one or more of five outputs: data is equal to the upper boundary mask, data is less than or equal to the upper boundary mask, data is greater than or equal to the lower boundary mask, data is equal to the lower boundary mask, and data is in the range between the upper boundary mask and the lower boundary mask. Thus the comparators can operate in two modes, range recognition to determine if the input data or address is within a selected range, and equate recognition to detemine if the input data or address is the same as a selected configuration.

In the embodiment described, there are six address recognition comparators, two configured as address equate comparators and four configured as address range comparators. There are six data recognition comparators, four configured as data equate comparators and two configured as data range comparators. One of the address equate comparators is programmed to recognize the target system's "opcode fetch" instruction and to provide an output signal upon the occurrence of that instruction.

Returning to the description of components shown in FIG. 3A, the high level resource generator 19 comprises an additional set of ten 32-bit comparator circuits. These comparators are similar in construction and operation to those used for the address and data recognition comparators 15 and 17, illustrated in FIG. 4. The inputs for the high level resource generator circuits are the outputs of the recognition comparators 15 and 17 rather than signals from the target system. The high level resource generator 19 can be programmed to recognize ten combinations of outputs from the recognition comparators 15 and 17, to construct complex event definitions. The ten outputs are distributed as follows: four to X-function generator 21, four to Y-function generator 23 and two to both X and Y function generators. The output signals are sent to the function generators, which are on a different p.c. board, via high level resource bus 16.

Power supply 49 is a simple buck regulating switching power supply, to provide a source of 3.3 V, 3.3 A power for the recognition comparators 13, 15 and 17. Clock 47 is a 10 Mhz clock generated from a 20 Mhz clock whose output is divided by 2. The output pulses of clock 47 are distributed to various counters in the analyzer via system bus 14.

Count mapper 43 and line counter 45 in combination constitute count statements circuitry 40, which counts the occurrences of a high level language instruction called a code line or simply a "line". Each high-level language line typically generates many low-level language opcodes, and the data on the emulation bus is in opcode, low-level form. Only the first opcode generated by each high-level language line should be counted to determine how many times that line was executed.

The count mapper 43 is a RAM which maps the opcodes received over the emulation bus 12 into address locations in the line counter 45 which represent up to 255 chosen lines of high level language.

The line counter 45 comprises a 256×12-bit RAM and a read-increment-write circuit. When line counter 45 receives the count enable signal from the function generator 25, it reads the value at the address location, received from count mapper 43, increments the value by one, and writes the incremented value back into the same address location. Thus at the end of a measurement, each of the address locations assigned to count a high level language line contains the count of occurrences of that line.

The circuitry on the p.c. board shown in FIG. 3A is connected to the circuitry on the p.c. board shown in FIG. 3B via emulation bus 12, system bus 14 and high level resource bus 16.

Referring now to FIG. 3B, the second p.c. board contains the fast sequencer 22, the X and Y measurement function generators 21 and 23, dedicated function generator 25, timer 27 and occurrence counter 29.

The "X" and "Y" measurement function generators 21 and 23, along with the dedicated function generator 25 translate general purpose output signals from the high level resource generator into special purpose, "dedicated" functions. The dedicated functions produced are used to control specific procedures of the analyzer. For example, the "Store" function causes the current cycle to be stored in acquisition memory; the "Timer Count" function determines whether or not timer 27 will be count enabled for the current cycle.

Figure 5:
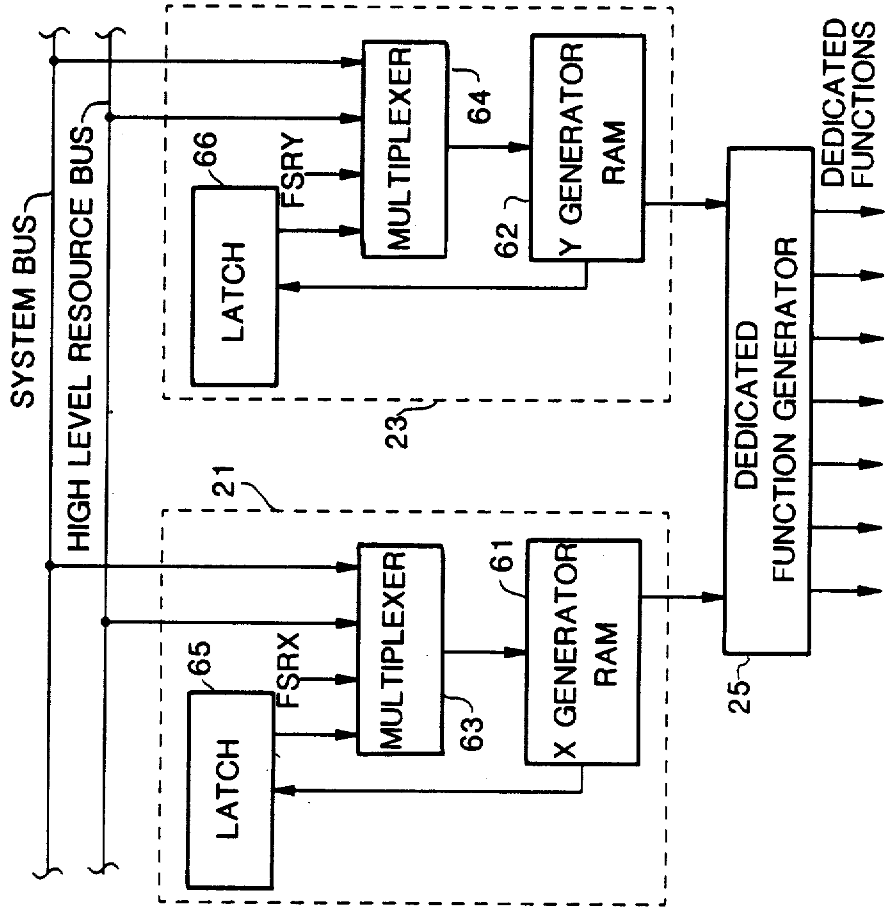
FIG. 5 is a simplified block diagram which illustrates in greater detail the components of the X and Y measurement function generators shown in FIG. 2.

FIG. 5 depicts a block diagram of the components of the X and Y function generators. X function generator 21 comprises X generator RAM 61 (a 4k deep by 20-bit mapper RAM), a 12-bit multiplexer 63 to select what goes on the RAM address bus, and a 4-bit latch 65. X generator RAM 61 is loaded with address information from microprocessor 39 through multiplexer 63. The programming of the addresses in X generator RAM 61 determines which outputs from high level resource generator 19 affect which dedicated functions. The latch 65 provides a means for creating sequences within X generator 21. A feedback path between latch and X generator RAM 61 allows a state of latch 65 to be used in a manner similar to an input from high level resource generator 19. For example, the function created in the RAM might be defined as "true" for some combination of high level resource inputs and the latch being in a certain state. The output signals of X generator RAM 61 define the "next state" via the feedback path to latch 65, and also provide input signals to dedicated function generator 25.

Y function generator 23 is similar to the X generator, except Y generator RAM 62 is 16 bits wide instead of 20 bits wide. Multiplexer 64 and latch 66 function like the equivalent circuits in the X generator. Output signals from Y generator RAM 62 also provide input signals to dedicated function generator 25.

Dedicated function generator 25 combines the output signals from X and Y function generator RAMS 61 and 62, and three other special purpose signals (store and stop signals from the fast sequencer and a memory full signal) to produce the dedicated functions output signals.

Figure 6:
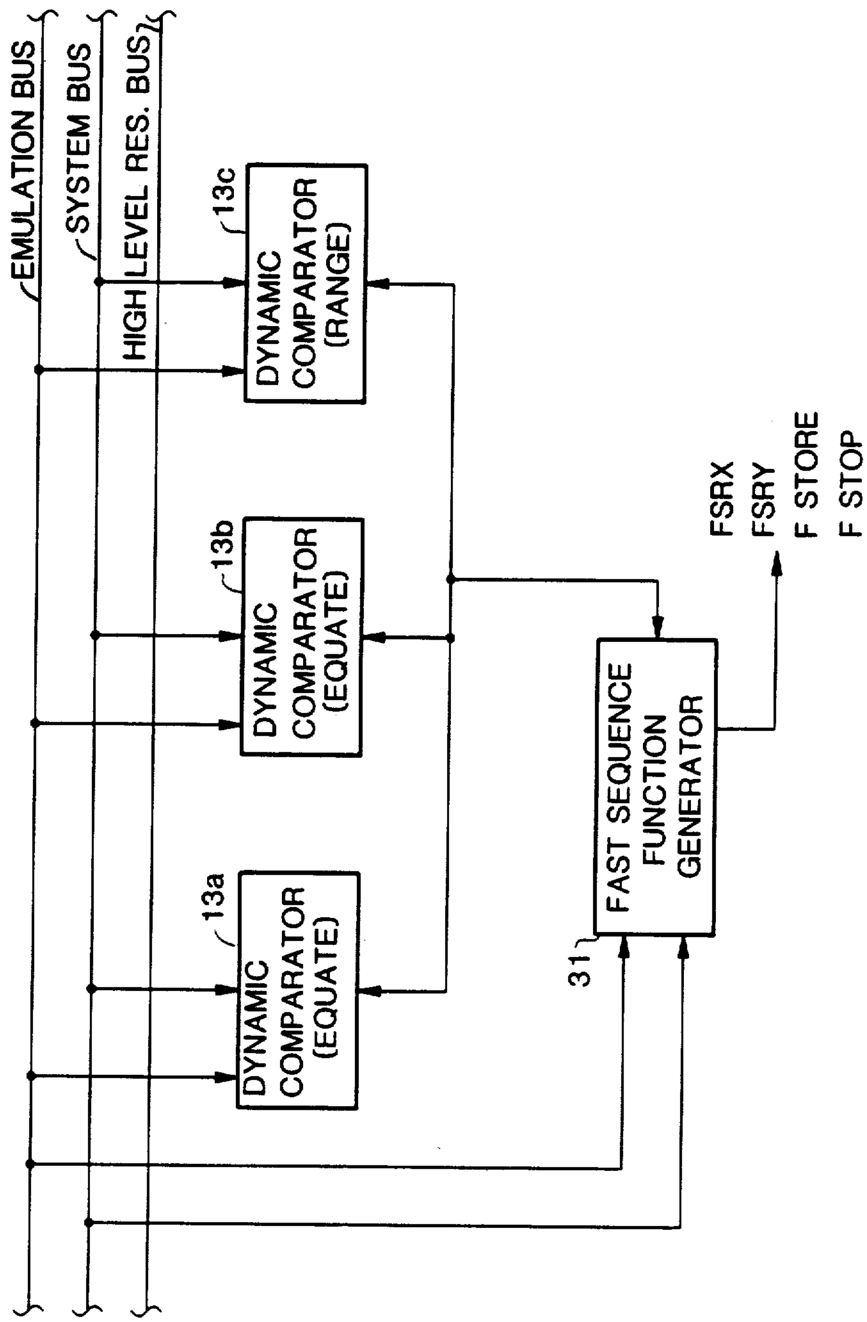
FIG. 6 is a simplified block diagram which illustrates in greater detail the components of the fast sequence function generator shown in FIG. 2.

The dynamic recognition portion of the analyzer, referred to as fast sequencer 22 on FIG. 3B, and shown in more detail in FIG. 6, comprises three dynamic recognition comparators 13*a*, 13*b* and 13*c* and fast sequence function generator 31. With fast sequencer 22, the analyzer can trace dynamically activated variables on a real-time basis. Dynamically activated variables, used in many high level languages as local variables, have no permanently assigned memory address, but are assigned an address, usually on a stack, when the variable is needed during program execution.

One thing that is known about these variables is where the variable will be stored on the stack relative to a stack reference address used in the procedure which activates the variable. Thus, once the variable is activated, its location is defined if the stack reference address can be determined. This reference address, or "hook" is placed on the stack when the procedure to activate the variable is entered. Another quantity known relative to the hook is the return address, which is used to indicates that the variable has been inactivated and is no longer valid.

The fast sequencer is programmed to watch for entry into the procedure, determine the stack reference address, calculate the address range for the dynamic variable and then signal any access to the variable until it is inactivated.

To accomplish this, before starting a measurement, one dynamic recognition comparator 13*a* is loaded with the entry address for the procedure to activate the variable, and a second dynamic range comparator 13*b* is loaded with the status of the instruction which defines the stack reference address. The fast sequencer is loaded with the offset values which determine the range of locations of the dynamic variable and the location of the return address relative to the stack reference address.

When comparator 13a signals entry into the procedure, the fast sequence function generator begins to monitor comparator 13b for the "hook" operation. When the "hook" operation transpires, fast sequence function generator 31 acquires the current emulation address (actually the stack location), and adds this address to the stored offset values to determine the upper and lower boundary addresses for the location range of the dynamic variable. The sequencer 31 loads these boundary addresses into the third dynamic comparator 13c. Thus, the third comparator 13c is configured in real-time upon activation of a variable being traced to signal access to that dynamic variable. Upon any access to the variable, the fast sequence function generator provides a signal (F_STORE) to the dedicated function generators 25 to enable the store function and store the current state in acquisition memory 35.

The fast sequence function generator 31 also computes the return address of the stack from the hook address and the stored return address offset. The fast sequence function generator 31 loads this address into dynamic comparator 13b, replacing the stack reference instruction status which is no longer needed. Thus, comparator 13b is configured to signal an exit from the procedure, indicating the variable being traced is no longer valid. At this point, if further tracing of the variable is required, the sequence is reinitiated, to determine the new address range allocated to the variable when it is activated subsequently.

Timer 27 is a flexible 24-bit counter which can be programmed to count either signals from 10 Mhz clock 47 or from a state clock. Timer 27 can be reset before a measurement and then simply count an event or time until the end of the measurement. Alternatively, because the output of timer 27 is fed into X and Y function generators 21 and 23 just like a high level resource line, the timer can be loaded with an initial count and its output used to alter a sequence, cause a state to be stored or possibly stop the analyzer.

Occurrence counter 29 is a 16-bit counter which counts occurrences of events. Occurrence counter 29 can be reset before a measurement and then count the occurrences of an event during the measurement. Alternatively, like timer 27, the occurrence counter can be loaded with an initial value and used to alter a sequence or cause a state to be stored, for example, after the Nth occurrence of an event. The output of the occurrence counter is fed into high level resource generator 19, and is thus similar to an output from the recognition comparators 15 and 17.

Emulation bus 12, system bus 14 and high level resource bus interconnect the p.c. board of FIG. 3B with the boards of FIGS. 3A and 3C.

The third p.c. board, shown in block diagram form in FIG. 3C, includes acquisition memory 35, floating point counter 33, opcode address register 37 and microprocessor 39.

Acquisition memory 35 comprises a 96-bit wide by 4096 deep RAM. During a measurement, acquisition memory stores the currently available block of data upon a signal from the store function in dedicated function generator 25. Each block of data stored in acquisition memory includes 96 bits: 8 bits of status, 24 bits of address and 16 bits of data from emulation bus 12, 24 from the opcode address register 37, 20 bits from the floating point counter 33 and 4 flag bits.

There are two modes of storing information in acquisition memory 35, sequential and random access. In sequential mode, the memory is filled by storing the first block of data in a fixed location and storing succeeding blocks of data in sequentially following locations. The sequential mode is used generally for storing the data acquired during a measurement.

The random access mode is used for a measurement called "last access", which stores data concerning the last occurrence of a chosen event. The event is typically access to a variable. Because the number of times the variable is accessed may exceed the capacity of acquisition memory, it is not effective to simply sequentially store all accesses. In random access mode, data from an access to a given variable is written over data from any previous access to that variable. Each variable to be traced is thus assigned its own address location in acquisition memory. High level resource generator 19 is configured to output the assigned memory address to direct acquisition memory 35 to store the current emulation data at the proper address. All event data is stored, but all unwanted event data is stored in a single address location in acquisiton memory 35, designated the "discard" location. Thus, at the end of the measurement, the information concerning the last access to each chosen variable is stored in the memory location assigned to that variable.

When any measurement is completed, the data stored in acquisition memory 35 can be unloaded by microprocessor 39 for postprocessing and display of the data to the user.

Opcode address register 37 comprises three 8-bit latches which can temporarily save the address information currently on emulation bus 12. The opcode address register latches the current emulation address upon receiving a signal from the address recognition comparator which is programmed to recognize when an "opcode read" is being performed by the target system. Thus, opcode address register 37 latches the latest opcode address.

Opcode address register 37 is updated after the current state is stored in acquisition memory. Thus the current emulation address plus the previous opcode address are stored. When the current emulation address is an opcode address both this latest opcode address and the previous opcode address are stored. This can aid in sorting out program flow in certain measurements.

Floating point counter 33 can count states or can be used as a timer counting pulses from 10 Mhz clock 47, depending on which measurement mode is being carried out. Whenever a state is stored in acquisition memory 35, the floating point counter value is also stored.

Microprocessor 39 is the interface between the software debugging analyzer and the host system via the BPC bus 18. Microprocessor 39 translates the low-level data acquired in acquisition memory 35 into high-level symbols suitable for display to the user by accessing the compiler database. Although microprocessor 39 does not participate actively in data acquisition, it translates the measurements specified by the user into the constructs required to set up the other components of the analyzer for making the measurements.

The user installs certain controlling software into the host system when he installs the software debugging analyzer. That controlling software implements the various commands entered on keyboard 11 through which the user will operate the software debugging analyzer. As those commands are invoked, the controlling parameters for the various measurements emerge and are transferred to the onboard microprocessor 39 where they are used to configure the hardware elements of the software debugging analyzer and to control the operation of that circuitry. The user also installs certain compiler database information concerning the target system under test, which is used in decoding high level language symbols into addresses and vice-versa. Upon completion of the measurement, the raw data collected is transmitted to microprocessor 39 where it is post-processed to remove any extraneous data captured and relayed back to the host system processor where the processing is completed by reducing the data and creating various displays of the results on display 3.

Microprocessor 39 is coupled to each of the system elements depicted in FIG. 2 by system bus 14. After microprocessor 39 receives the parameters of the measurement to be performed, microprocessor 39 configures the circuit elements of the software debugging analyzer as described below.

If a measurement requires recognition of static address, data or state information, microprocessor 39 loads the proper configurations into address recognition comparators 15 and data recognition comparators 17. Microprocessor 39 configures high level resource generator 19 to define complex combinations of events recognized by the comparators 15 and 17. Microprocessor 39 also adjusts the operation of the sequencers in X and Y measurement function generators 21 and 23 to control the logic necessary to implement the high speed real-time acquisition of data carried out by dedicated function generator 25.

For measurements which require recognition of dynamically activated variables, microprocessor 39 loads the proper configurations into the dynamic recognition comparators 13. Microprocessor 39 also adjusts the operation of the sequence in fast sequence function generator 31, so that the fast sequencer can control the operation of the dynamic recognition comparators 13 during the real-time measurement, loading the address of the dynamically activated variables into the comparators "on the fly" as those variables are activated and their locations defined.

Microprocessor 39 also configures count mapper 43, and initializes floating point counter 33, timer 27 and occurrence counter 29.

When the measurement has been completed, microprocessor 29 unloads the data stored in acquisition memory 35 and the count data stored in line counter 45, if required. Microprocessor 39 then post processes the data to remove any extraneous data such as unexecuted prefetched instructions and to translate the data from low-level code to high-level language. This translation is accomplished by referring to the compiler database information resident in the host system. Finally, microprocessor 39 passes the post processed data acquired from the measurement to the host system for display to the user.

The details of the software by which the microprocessor 39 operates are in the source code listing of that software which is attached as Appendix A. Reference to this appendix will be useful in answering any detailed questions concerning the operation of microprocessor 39.

Measurements

Four measurements, called trace measurements form the backbone of the high-level software debugging operations provided by the software debugging analyzer. The trace modules and the trace data flow measurements are more global, giving the programmer an overview of both program and data flow at the module level. The trace statements and trace variables measurements are more local, and give the precise order of statement execution or the values of specific variables each time they are accessed. Two additional measurements, time modules and count statements aid the designer in software debugging as well as optimizing and testing procedures. While the measurements described below do not exhaust the entire range of measurement capabilities of the flexible hardware resources associated with the analyzer, they demonstrate the use of those hardware resources in performing measurements central to the software debugging process.

Trace Modules

The trace modules measurement tracks program flow by capturing the entry and exit to the specified modules. This is particularly useful in situations where modules are written by different programmers and may even be in different high-level languages. Tracing module flow when they are all first integrated shows in what order they were called and identifies possibly general locations of problems.

Either specifically named modules or all the modules in a file can be traced. The "all" specification counts as one symbol; the modules can also be in up to four different non-adjacent files or in up to ten adjacent files.

Ten explicitly named modules can be traced, with additional limitation imposed in this particular embodiment by the number of address range comparators. However, if the modules are not adjacent, only four can be traced (there are only four range resources). If all the modules in a file are specified, up to 255 different modules can be traced. In the most common setup of this measurement, using the "all" specification, no more than one range is used per file, so this is not a real limitation. The analyzer can trace recursive calls indefinitely and can trace both Pascal and C modules in the same measurement.

The analyzer can run the trace modules measurement in both real-time and non-real-time modes. In real-time, all modules in up to ten files can be traced to see program flow, including interrupt routines. Accurate time tags are displayed indicating the time spent in each module. Thus, the programmers can see quickly the order in which the modules are executed, when recursion occurred, how often an interrupt routine was called, and how much time was spent in each module. These are all useful measurements to generally locate a problem; if any of this information deviates from expectations, then another measurement can be made to localize the problem.

Figure 7:
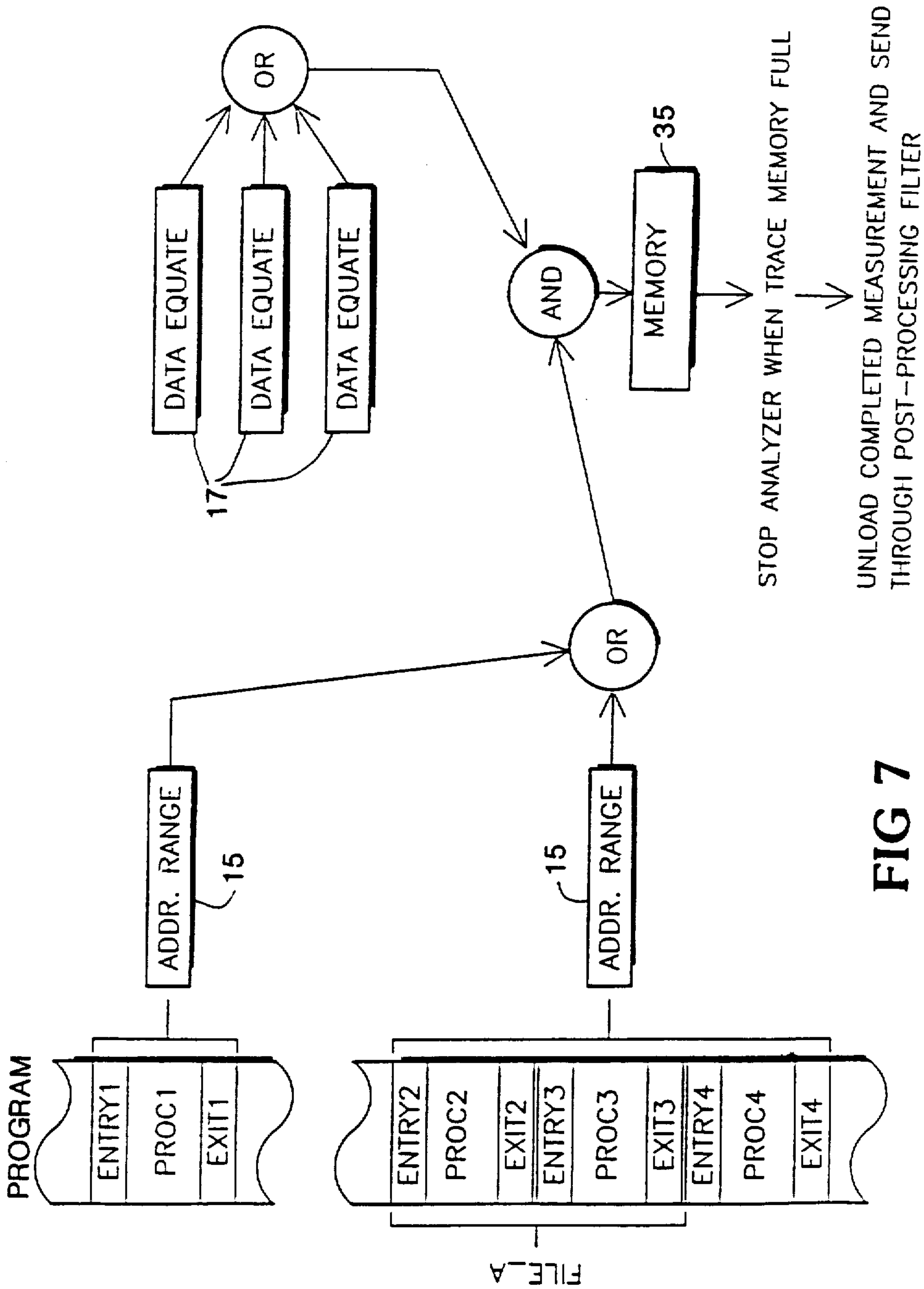
FIG. 7 is an idealized flow diagram illustrating the operation of the analyzer for the trace modules measurement.

FIG. 7 shows an example of how the analyzer's hardware resources are used for a measurement "trace modules PROC1, all FILE_A, PROC4". Address comparators 15 configured as range comparators and data comparators 17 configured as equate comparators are used to detect module entry and module exit. The data equate comparators 17 are what actually determine the entry and exit points. Microprocessor 39 sets up these comparators to recognize the first and last instructions of a module based on data bus patterns. The address range comparators 15 are set up and used to qualify the entry and exit points so that only the ones in the specified modules are saved.

Address ranges are set up around the addresses associated with the specified modules. In this example, even though three symbols were specified, only two ranges are needed; by definition all the modules in a single file are adjacent, and it happens that PROC4 is adjacent to FILE_A.

Finally, the results of the low-level recognition resources are logically combined by setting up high level resource generator 19, so that dedicated function generator 25 causes the data associated with an entry or exit point to be stored in acquisition memory 35. In prefetching, sometimes data is stored which was not a true entry; microprocessor 39 post processes the data and these points are filtered out.

Ten explicitly named modules can be traced; with an additional limitation imposed in this particular embodiment by the number of address range comparators. However, if the modules are not adjacent, only four can be traced (there are only four range resources). If all the modules in a file are specified, up to 255 different modules can be traced.

Trace Data Flow

The trace data flow measurement tracks the values of data at the entry and exit points of a procedure. Both static and dynamic variables can be traced. However, local variables and variables passed by value cannot be displayed at the exit point of the procedure, for at this point they are undefined. Unlimited recursion can also be traced. Up to three different modules can be traced in one measurement, with up to 10 symbols specified. Since the traced data is not accessible on the emulation bus at entry and exit points of a module, this measurement must be run in non-real-time.

Data can be viewed at entry and exit of a procedure, showing whether it was modified within the module. Values of important variables can be seen at each level of a recursive procedure; this is especially useful if a procedure is stuck in infinite recursion. The variable which should cause an exit condition can be traced and the bug quickly found.

Figure 8:
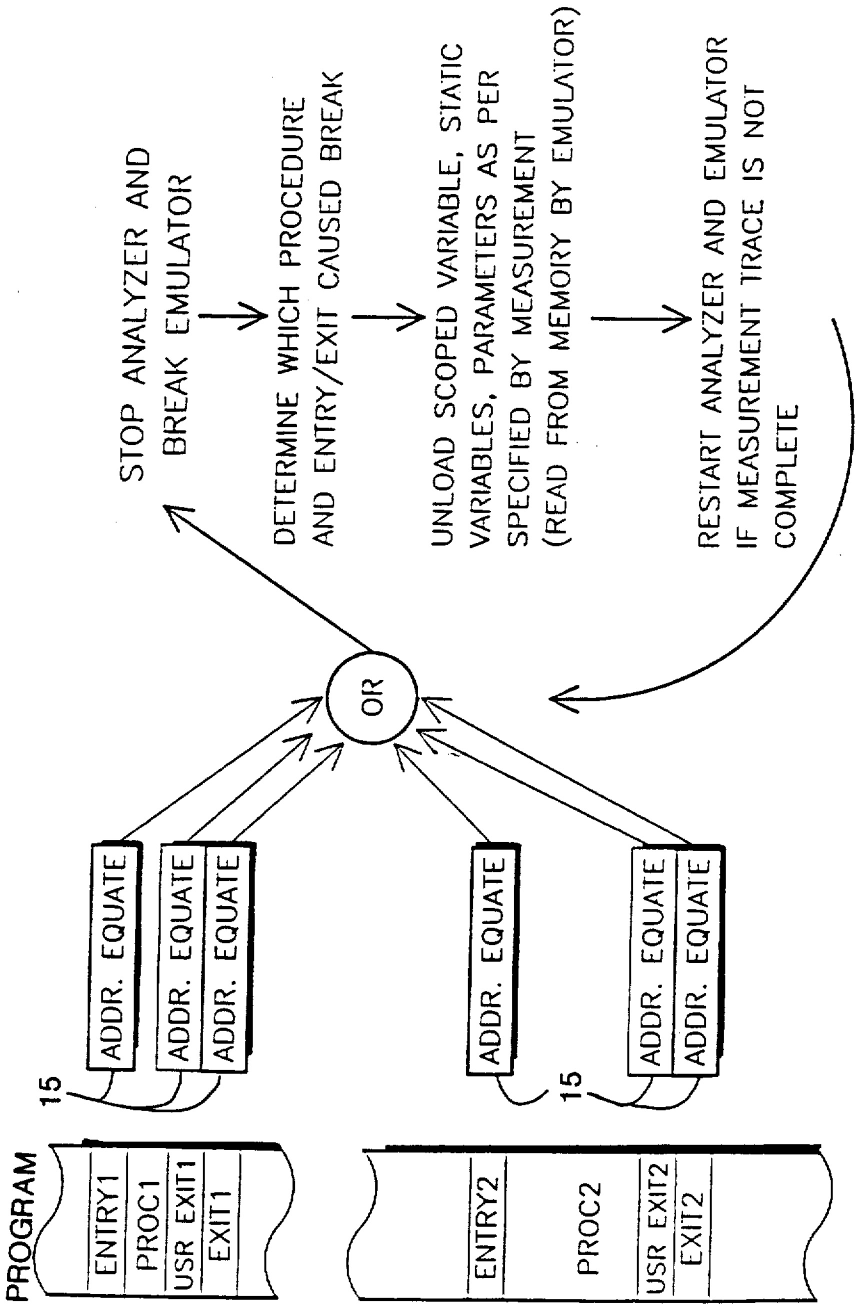
FIG. 8 is an idealized flow diagram illustrating the operation of the analyzer for the trace data flow measurement.

FIG. 8 shows how the analyzer's resources are used in a trace data flow measurement. As explained earlier, this measurement can only run non-real time because the analyzer needs information that is not flowing over the emulation bus 12. Three address recognition comparators 15 configured as equate comparators are used for each module, limiting the number of modules that can be specified to three. For each module, microprocessor 39 sets up one equate comparator for the entry, one for the exit, and a third comparator to recognize an address at the end of user code, just before the address of the module exit.

Three equate comparators are needed for each module being traced to accommodate recursive routines. By having an equate comparator set up to look for an address that occurs within the module, but before the exit and preferably at the end of the user code, any calls would have to have occurred previously.

When one of the equate comparators is satisfied, the dedicated function generator halts the analyzer and the values of specified variables are read from emulation or user memory. Then the analyzer and emulator are restarted.

The only limit imposed on the number of variables specified is the 10 symbol limit on entering the measurement. Of course, variables that are not scoped at module entry or exit cannot be traced.

Trace Statements

The trace statements measurement traces statement flow within a single module. The statements are displayed in the order of their execution and variable values are displayed. The measurement can run in both real-time and non-real-time. The statement range, which can be unlimited, can be defined as the entire procedure or a line range within a procedure. There is also a "don't care" specification, that traces everything occurring on the emulation bus; it can trace statements in different modules. The advantage to running in non-real-time is that dynamic variables can be traced. Otherwise, only the values of static variables will show up on the display; using "don't care" no variable values will be displayed. Again, time tags are displayed showing an accurate execution time for each high-level statement.

This measurement is useful when a problem has been isolated down to a module. The display gives a step-by-step view of the execution order of the high-level statements, much like a state display of low-level code. The debugging process can be greatly sped up, as all the relevant information concerning the execution of a module is displayed. This is a highly effective way to observe the interaction between program and data flow.

Figure 9:
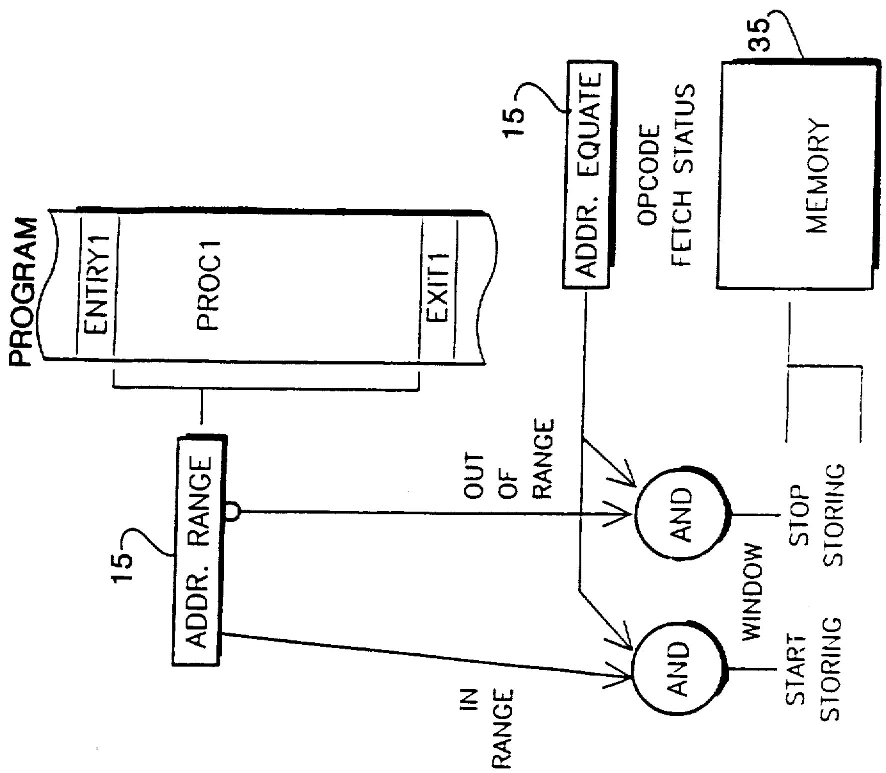
FIG. 9 is an idealized flow diagram illustrating the operation of the analyzer for the trace statements measurement.

Trace statements can be divided into two measurements, a real-time one and a non-real-time one. The real-time one is less complex conceptually because the emulator is never halted, and all the stored information is flowing over emulation bus 12. FIG. 9 illustrates an example of how the analyzer's resources are used in making a real-time trace statements measurement over a line range or procedure. Microprocessor 39 sets up one address recognition comparator 15 configured as a range comparator to detect activity in the specified line range to determine when a storing "window" should be opened. The special address recognition comparator which is set up to detect an opcode fetch is used to signal the execution of code. The high level resource generator 19 is set up so that these two signals are ANDed together and when they go true a "window" is opened and all the data flowing over the emulation bus is stored in acqusition memory. When the address range comparator 15 signals that the program is executing code outside of the specified line range, then the storing "window" is closed. A trace statements measurement using the "don't care" specification is simply the analyzer executing with the window continuously open.

The non-real-time trace statements measurement is more complex because more information is gathered, including information about dynamic variables. As in the real-time measurement one address recognition comparator 15 is programmed to detect the range of statements traced and one address recognition comparator is used to detect an opcode fetch to create a mesurement "window". In addition, two address recognition comparators are set up to recognize the entry and exit points. Upon entry or exit, the analyzer halts the emulator using the dedicated function generator 25 and stores data concerning the location and value of dynamic variables.

Trace Variables

The trace variables measurement allows the user to trace all acccesses to specified variables during program execution. The measurement can run both in real-time and non-real-time; the feature set for both modes is identical. Up to ten variables can be traced in each measurement, but, during execution the address recognition comparators 15 are used, so sometimes the number of static variables that can be traced is reduced. Up to ten of dynamic vairables under a given module header can be traced. Source line numbers are displayed, convenient for localized debugging. A variable which is seen to have an incorrect value in a trace data flow measurement can thereafter be traced using the trace variables measurement, and all the reads and writes to it will be displayed. It is then a simple matter to determine where the program went astray.

Figure 10:
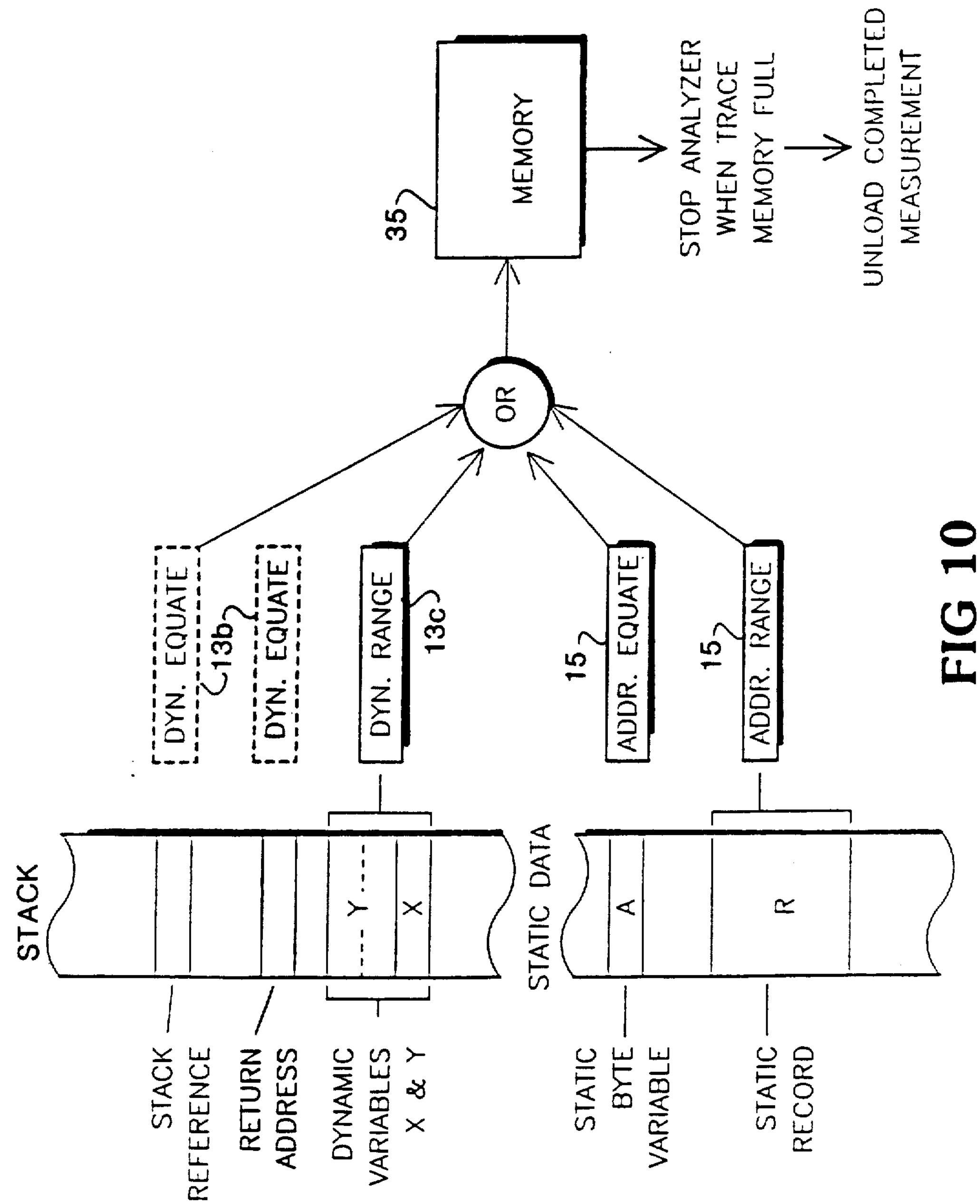
FIG. 10 is an idealized flow diagram illustrating the operation of the analyzer for the trace variables measurement.

Trace variables works the same way in real time as in non-real time, as illustrated in FIG. 10. Static variables are comparatively easy to trace. Address recognition comparators 15 configured as equate comparators are used for static variables that are a byte wide, and address comparators configured as range comparators are used on longer variables, records and arrays. The analyzer will also use one address range comparator over any adjacent variables. If the range is accessed the analyzer's recognition logic circuits, through dedicated function generator 25 cause the address and values to be stored in acquisition memory 35.

Dynamic variables are traced in a similar way. However, since the number of dynamic recognition comparators is less, one dynamic comparator is used to cover all variables even if they are not adjacent. During post-processing, unwanted accesses are filtered out by microprocessor 39. The difficulty in tracing dynamic variables is locating the stack reference, and the actual memory locations for these dynamic variables, since these are not defined until the program is executing.

Microprocessor 39 sets up one dynamic equate comparator 13*a* to locate the entry of the procedure where the dynamic variables of interest are defined. As described earlier, the first data write after a module entry point is the dynamic variable stack reference, which is stored by the fast sequence function generator 31. Using this stack reference, and the offsets for dynamic variables which microprocessor 39 provided from the compiler data base, fast sequence generator 31 determines the locations range of the dynamic variables and loads these addresses into the other dynamic recognition range comparator 13*c*. This is done before any of these variables have been read or written to by the user program. Then the dynamic recognition comparator 13*b*, which was used to recognize the first data write, is re-loaded to recognize the location on the stack of the procedure's return address. Fast sequence function generator 31, through dedicated function generator 25, causes all accesses to the range stored in the second comparator to be stored in acquisition memory 35 until equate comparator 13*b* indicates that the return address has been read. After this the variables no longer exist and the sequence is started up again.

Time Modules

Up to four modules can be timed using the time modules measurement, which displays the minimum, maximum, and mean time spent in each module. The measured time includes all time between entry of the specified module and exit from that module, including time spent in subroutine calls and interrupts. Timing recursive modules is handled by the analyzer, up to 255 levels deep. The measurement can be run in both real-time and non-real-time.

This measurement is useful in a variety of cases. Modules can be tested to see if they are executing within specified times. Inefficient modules can be spotted and then optimized. Also, the effect that interrupts have on modules can be studied. The display also shows the number of times the module was timed, which gives an indication of the statistical accuracy of the measurement.

Figure 11:
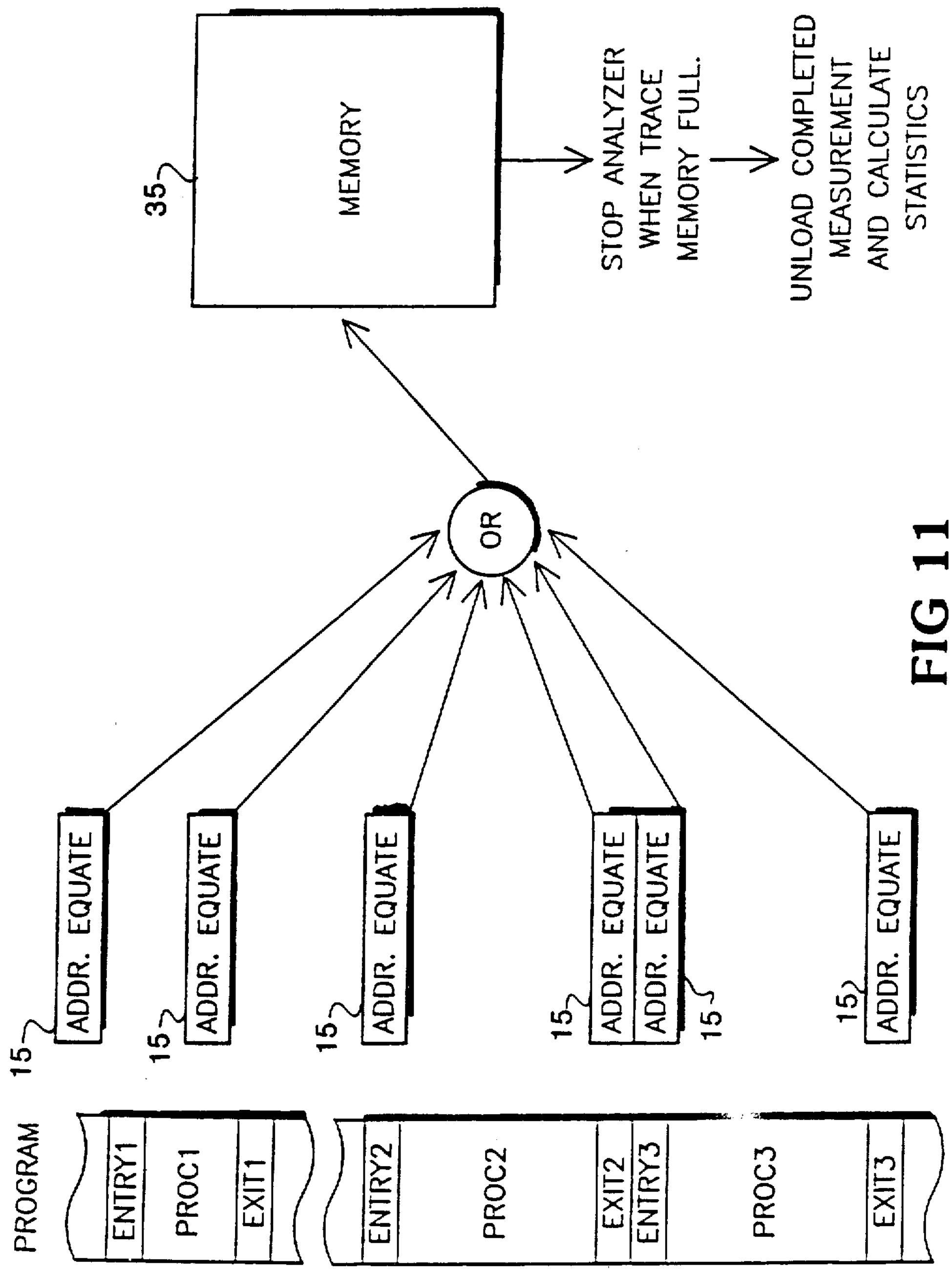
FIG. 11 is an idealized flow diagram illustrating the operation of the analyzer for the time modules measurement.
Figure 12:
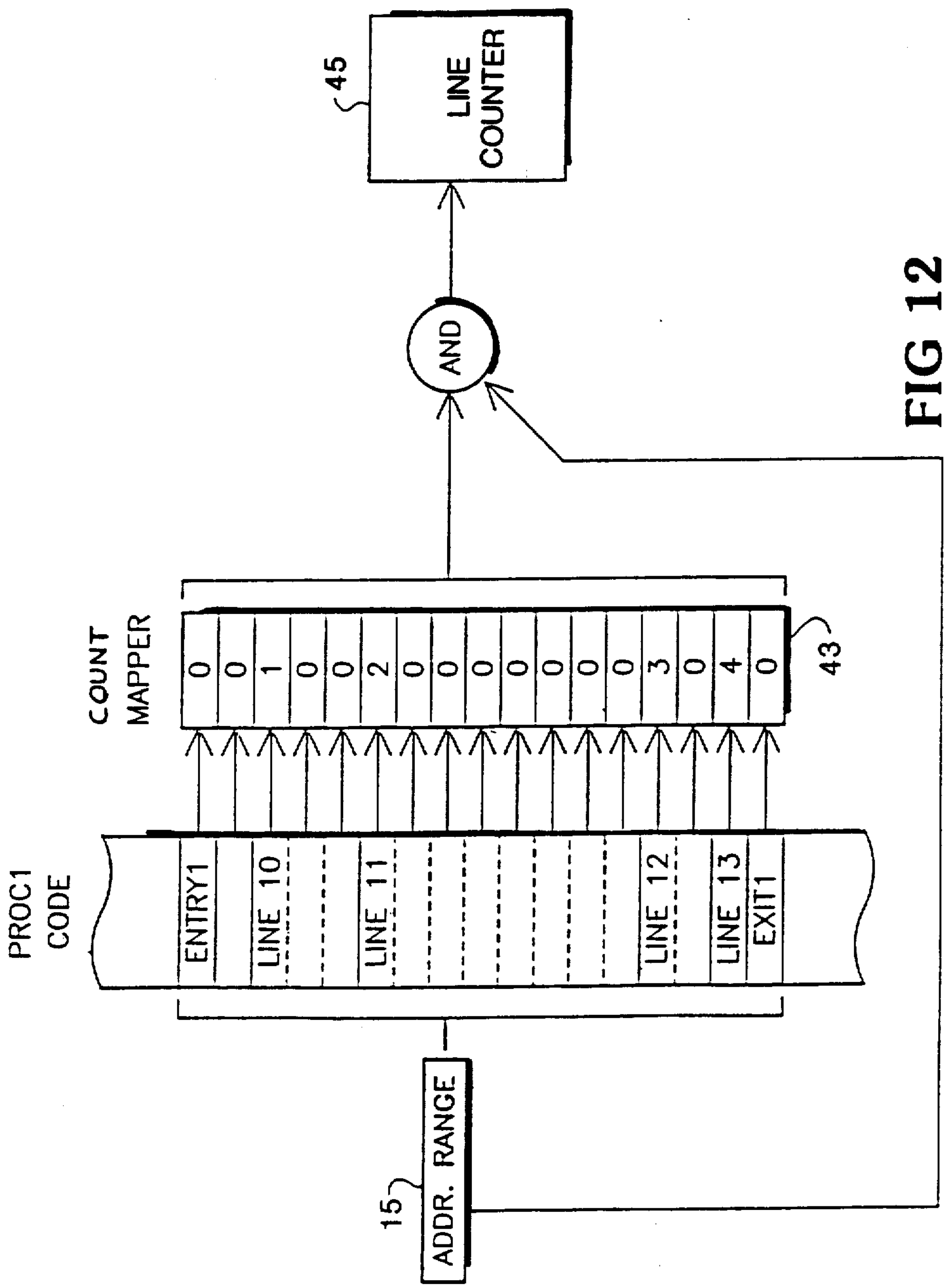
FIG. 12 is an idealized flow diagram illustrating the operation of the analyzer for the count statements measurement.

FIG. 11 illustrates how the analyzer's resources are used to make the time modules measurement. Two address recognition comparators 15 configured as equate comparators are used for each module, thus a limit of four modules can be traced. These equate comparators are set up by microprocessor 39 to look for entry and exit points of each module. When an entry or exit is detected, the analyzer's logic recognition circuits, through dedicated function generator 25 cause the state to be stored in acquisition memory 35. Dedicated function generator 25 also starts the floating point counter 33 at the beginning of the measurement, and the absolute time for every exit and entry point is stored in acquisition memory 35 as a time tag with the stored state. When the measurement is complete, microprocessor 39 uses these time tags to determine the time spent in each module, and then determine the statistical results.

Count Statements

The count statements measurement counts the number of times each statement in a specified module or line range is executed. Up to 255 statements can be counted, but they all must be in one module. The counters will count up to 4094 then overflow; however, if only one line is traced, the analyzer uses the floating point counter 33 which has a much larger20-bit floating point capacity.

This measurement's main benefit is in the area of software coverage testing. In the testing phase of software development it is often difficult to know whether all parts of the software have been exercised. For example a certain branch may never be taken or some parts of a case statement may never be executed. Count statements is a quick and simple way to verify this coverage testing. If a statement is never executed, either another test can be run to exercise it, or it can be removed. Also, count statements is an easy way to verify the operation of loop counters, as the statements within the loop should be executed a known number of times.

The count statements measurement uses the same address recognition comparators used ih the other measurements, but also uses some dedicated hardware, the count mapper 43 and line counter 45. The analyzer can trace 255 lines in one module, but this traced part of the program cannot exceed 4k bytes of memory because the count mapper 43 is a 4k to 256 "bucket" mapper. The "bucket" refers to the 12-bit values in line counter 45 associated with each source line. The measurement works by setting up the address range comparator 15 for recognition over the specified module/line range to drive the count enable signal. Before the measurement is executed, microprocessor 39 loads count mapper 43, using the line number information found in the compiler database file. When the measurement is executed, the appropriate counter or "bucket" is incremented when the first machine code statement corresponding to a given line number is executed. Thus a line that contains many machine instructions (they could even loop and execute a number of times) is only incremented once.

APPENDIX A

```
LOCATION OBJECT CODE LINE     SOURCE LINE

                   "68000"
                   ****************************************************************************************
                   ***********  ENTRY POINTS TO CODE AND STACK FOR FORKING ********************************
                   ****************************************************************************************
                                 EXTERNAL  STACK_,KIPMIX
                                 PROG
 000000 00000000                 DC.L KIPMIX       PT TO ENTRY POINT.
 000004 00000000                 DC.L STACK_       PT TO STACK
                                 END

Errors=    0

 00000000  1  "68000" PREPROCESS
 00000000  1  #DEFINE M68000 TRUE
 00000000  1  (*****************************************************************************************)
 00000000  1  (**********  MAIN  ***********************************************************************)
 00000000  1  (*****************************************************************************************)
 00000000  1  (* MAIN PROGRAM OF SODA DATA DISPLAY (GENERAL CONTROL, KEYBOARD MONITOR, PHYSICAL DISPLAY CONTROL*)
 00000000  1  (*****************************************************************************************)
 00000000  1  PROGRAM PMAIN;
 00000000  1  $EXTENSIONS ON$
 00000000  1  $WIDTH 120$
 00000000  1  $LIB_ABS_LONG$
 00000000  1  $CALL_ABS_LONG+$
 00000000  1  #INCLUDE TYPES:KIP           (*TYPE DEFINITIONS COMMON TO BOTH PROCESSORS*)
 00000000  1  #INCLUDE INCLUDE:KIP         (*TYPE DEFINITIONS FOR DISPLAY-MONITOR COMMUNICATION*)
 00000000  1  $PAGE$
 00000000  1  (*******************************************************************)
 00000000  1  (******** STRINGS **************************************************)
 00000000  1  (*******************************************************************)
 00000000  1  VAR
 00000000  1  $EXTVAR ON$
 00000000  1  $FAR$
 00000000  1  (********* COLUMN HEADINGS ******************************************)
 00000000  1  H000       :STRNG;     (*"Symbol"*)
 00000000  1  H001       :STRNG;     (*"Value"*)
 00000000  1  H002       :STRNG;     (*"Stat"*)
 00000000  1  H003       :STRNG;     (*" Time-rel"*)
 00000000  1  H004       :STRNG;     (*" Time-abs"*)
 00000000  1  H005       :STRNG;     (*"Count-rel"*)
 00000000  1  H006       :STRNG;     (*"Count_abs"*)
 00000000  1  H007       :STRNG;     (*"Source"*)
 00000000  1  H008       :STRNG;     (*"Source path"*)
 00000000  1  H009       :STRNG;     (*"Symbol path"*)
 00000000  1  H010       :STRNG;     (*"Minimum Maximum Mean Count"*)
 00000000  1
 00000000  1  (********* STATUS LINES *********************************************)
 00000000  1  S000       :STRNG;     (*" "*)
 00000000  1  S001       :STRNG;     (*"Formatting display"*)
 00000000  1  S002       :STRNG;     (*"Copying measurement"*)
 00000000  1  S003       :STRNG;     (*"Formatting next page"*)
 00000000  1  S004       :STRNG;     (*"Formatting previous page"*)
 00000000  1  S005       :STRNG;     (*"Awaiting command"*)
 00000000  1
 00000000  1  (********* STATUS FIELD     ****************************************)
 00000000  1  F000       :STRNG;     (*"read"*)
 00000000  1  F001       :STRNG;     (*"write"*)
 00000000  1  F002       :STRNG;     (*"entry"*)
 00000000  1  F003       :STRNG;     (*"exit"*)
 00000000  1  F004       :STRNG;     (*" "*)
 00000000  1
 00000000  1  (********* MISCELLANEOUS     ***************************************)
 00000000  1  #IF M68000
 00000000  1  M001       :STRNG;     (*-   "-*)(* USED FOR REPEATING LINES IN TRACESTM, SODA *)
 00000000  1  #ENDIF
 00000000  1  $EXTVAR OFF$
 00000000  1  $PAGE$
 00000000  1  (*******************************************************************)
 00000000  1  (******** LOCAL STATICS ********************************************)
 00000000  1  (*******************************************************************)
```

```
00000000 1 HEAP              :PTR;               (*POINT TO HEAP FOR MARK AND RELEASE*)
00000004 1 BIGBUFF           :BIGBUFF_PTR;       (*POINT TO THE BIGBUFF ARRAY*)
00000008 1 HEADINGS          :STRNG_PTR;         (*POINT TO STRNG OF COLUMN HEADINGS*)
0000000C 1 PRIMITIVE         :PRIMITIVE_PTR;     (*POINT TO THE PRIMITIVE REPRESENTING THE CURRENT NEWLINE*)
00000010 1 HOLD_PRIMITIVE    :PRIMITIVE_PTR;     (*POINT TO THE PRIMITIVE PREVIOUS TO THE CURRENT PRIMITIVE*)
00000014 1 MONITOR           :DISPLAY_SPEC_PTR;  (*POINT TO MONITOR COMMUNICATION TABLE*)
00000018 1 TOP               :INT;               (*ROW# IN BIGBUFF MAPPED TO 1ST ROW OF DISPLAY*)
0000001A 1 COLUMN            :INT;               (*COL# IN BIGBUFF MAPPED TO 1ST COL OF DISPLAY*)
0000001C 1 MODE              :INT;               (*STNTS_ONLY or STNTS_AND_DATA (applies to tracestmts only*)
0000001E 1 TRIG_KC9A         :KC9A_TAG;          (*64 BIT COUNT TAG OF TRIGGER POINT*)
00000026 1 HOLD              :BOOLEAN;           (*TRUE IF HOLD_PRIMITIVE IS VALID*)
00000027 1 STATUS_MESSAGE    :STRNG_PTR;         (*POINT TO STRNG TO BE DISPLAYED ON STATUS LINE*)
0000002C 1 FIRST_CALL        :BOOLEAN;           (*TRUE IF 1ST CALL AFTER INTIALIZATION ==> RESTORE TOM'S STATUS LINE*)
0000002D 1
0000002D 1
0000002D 1 (*************************************************************************)
0000002D 1 (******** GLOBAL STATICS ************************************************)
0000002D 1 (*************************************************************************)
0000002D 1 $GLOBVAR ON$
0000002D 1 ENVIRONMENT       :ENVIRONMENT_PTR;   (*POINT TO ENVIRONMENT RECORD, THIS IS THE ONE  AND ONLY GLOBAL VARIABLE*)
00000032 1 ZERO              :INTEGER;           (*32 bit constant 0*)
00000036 1 ONE               :INTEGER;           (*32 bit constant 1*)
0000003A 1 $GLOBVAR OFF$
0000003A 1 $PAGE$
00000000 1 (*************************************************************************)
00000000 1 (********** PROCEDURES ***************************************************)
00000000 1 (*************************************************************************)
00000000 1 FUNCTION  MINN(A,B:INT):INT;BEGIN IF A<B THEN MINN:=A ELSE MINN:=B; END;
00000000 1 FUNCTION  CENTER:INT;        BEGIN CENTER:=(TOP+MAXLINE DIV 2) MOD DATALINES; END;
00000000 1 PROCEDURE FMTKC9A            (KC9A_TIME_FLAG:BOOLEAN;DEST:PTR; DEST_OFFSET:INT; VAR BASE_TAG,CURR_TAG:KC9A_TAG);EXTER
00000000 1 PROCEDURE INIT_ENVIRONMENT   (VAR ERROR:INT);EXTERNAL;
00000000 1 PROCEDURE INIT_SCREEN        ;EXTERNAL;
00000000 1 PROCEDURE INIT_GETFILE       ;EXTERNAL;
00000000 1 PROCEDURE WRITE_SCREEN       (HEADINGS:STRNG_PTR; BIGBUFF:BIGBUFF_PTR; COLUMN,TOP:INT); EXTERNAL;
00000000 1 PROCEDURE STATUS_LINE        (P:STRNG_PTR; CODE:INT; POSITION:INT); EXTERNAL;
00000000 1 PROCEDURE MOVEBYTES          (SOURCE:PTR; SOURCE_OFFSET:INT; DEST:PTR; DEST_OFFSET:INT; COUNT:INT); EXTERNAL;
00000000 1 PROCEDURE GETCHAR            (SOURCE:PTR; SOURCE_OFFSET:INT; VAR CHARACTER:CHAR); EXTERNAL;
00000000 1 PROCEDURE PUTCHAR            (DEST:PTR;   DEST_OFFSET:INT;    CHARACTER:CHAR); EXTERNAL;
00000000 1 PROCEDURE FMTSYMBOL          (SOURCE,DEST:PTR; DEST_OFFSET:INT; VAR LEN:INT);EXTERNAL;
00000000 1 PROCEDURE FMTFILE            (SOURCE,DEST:PTR; DEST_OFFSET:INT; VAR LEN:INT);EXTERNAL;
00000000 1 PROCEDURE GET_REC_NUM        (VAR REC_NO:INT); EXTERNAL;
00000000 1 PROCEDURE P_FILE_ERR         (VAR DCB:DCB_TYPE; ERROR:INT);EXTERNAL;
00000000 1 PROCEDURE P_OPEN             (VAR NAME:FMGRNAME; FTYPE,DISC:INT; VAR DCB:DCB_TYPE;DCBSIZE:INT;VAR ERROR:INT);EXTERNAL
00000000 1 PROCEDURE P_CREATE           (VAR NAME:FMGRNAME; FTYPE,DISC:INT; VAR DCB:DCB_TYPE;DCBSIZE:INT;VAR ERROR:INT);EXTERNAL
00000000 1 PROCEDURE P_POSITION         (VAR DCB:DCB_TYPE; RECN:INT; VAR ERROR:INT);EXTERNAL;
00000000 1 PROCEDURE P_CLOSE            (VAR DCB:DCB_TYPE; VAR ERROR:INT);EXTERNAL;
00000000 1 PROCEDURE P_WRITE            (VAR DCB:DCB_TYPE; VAR IBUFF:INT; VAR ERROR:INT);EXTERNAL;
00000000 1 PROCEDURE P_CALENDAR         (DEST:PTR); EXTERNAL;
00000000 1 PROCEDURE FORMAT             (SIGN_FLAG:INT;SOURCE:PTR; SOURCESIZE:INT;
00000000 2                              DEST:PTR; DEST_OFFSET:INT; VAR DESTSIXE:INT; VASE:INT; JUSTIFY:INT);EXTERNAL;
00000000 1 #IF M68000
00000000 1 PROCEDURE BPC_READ           (DEST:PTR; SOURCE:INT; LEN:INT); EXTERNAL;
00000000 1 PROCEDURE INIT_TRACESTM      (VAR ERROR:INT);EXTERNAL;
00000000 1 PROCEDURE INIT_TRACEMOD      ;EXTERNAL;
00000000 1 PROCEDURE INIT_TRACEDATA     ;EXTERNAL;
00000000 1 PROCEDURE INIT_TRACEVAR      ;EXTERNAL;
00000000 1 PROCEDURE INIT_TRACEDONT     ;EXTERNAL;
00000000 1 PROCEDURE INIT_TIMEMOD       ;EXTERNAL;
00000000 1 PROCEDURE INIT_COUNTSTM      (VAR ERROR:INT);EXTERNAL;
00000000 1 PROCEDURE TRACEVAR           (PRIMITIVE:PRIMITIVE_PTR; DIRECTION:INT; INITIAL:INT; VAR ERROR:INT);      EXTERNAL;
00000000 1 PROCEDURE TRACEMOD           (PRIMITIVE:PRIMITIVE_PTR; DIRECTION:INT; INITIAL:INT; VAR ERROR:INT);      EXTERNAL;
00000000 1 PROCEDURE TRACEDATA          (PRIMITIVE:PRIMITIVE_PTR; DIRECTION:INT; INITIAL:INT; VAR ERROR:INT);      EXTERNAL;
00000000 1 PROCEDURE TRACEDONT          (PRIMITIVE:PRIMITIVE_PTR; DIRECTION:INT; INITIAL:INT; VAR ERROR:INT);      EXTERNAL;
00000000 1 PROCEDURE TIMEMOD            (PRIMITIVE:PRIMITIVE_PTR; DIRECTION:INT; INITIAL:INT; VAR ERROR:INT);      EXTERNAL;
00000000 1 PROCEDURE COUNTSTM           (PRIMITIVE:PRIMITIVE_PTR; DIRECTION:INT; INITIAL:INT; VAR ERROR:INT);      EXTERNAL;
00000000 1 PROCEDURE TRACESTM           (PRIMITIVE:PRIMITIVE_PTR; DIRECTION:INT; INITIAL:INT; VAR MODE,ERROR:INT); EXTERNAL;
00000000 1 PROCEDURE OUTIT              (LETTER:CHAR;VALUE:INT;BASE:CHAR); EXTERNAL;
00000000 1 PROCEDURE SLEEP_             (CHANNNEL:INTEGER; PRIORITY:INT); EXTERNAL;
00000000 1 #ELSE
00000000 1 PROCEDURE PREPARE_FILE       (VAR ERROR:INT); EXTERNAL;
00000000 1 PROCEDURE DUMP_HEADER        (VAR ERROR:INT);  EXTERNAL;
00000000 1 PROCEDURE OUTPUT_LINE        (SIZE:INT; IBUFF:FMGRBUFF_PTR; VAR ERROR:INT);  EXTERNAL;
00000000 1 PROCEDURE FINISH_FILE        (VAR ERROR:INT);  EXTERNAL;
00000000 1 PROCEDURE MARK               (MRK:PTR);EXTERNAL;
```

```
00000000 1 PROCEDURE RELEASE          (MRK:PTR);EXTERNAL;
00000000 1 PROCEDURE J_INIT_TRACESTM  (VAR ERROR:INT);EXTERNAL;
00000000 1 PROCEDURE J_INIT_TRACEMOD  ;EXTERNAL;
00000000 1 PROCEDURE J_INIT_TRACEDATA ;EXTERNAL;
00000000 1 PROCEDURE J_INIT_TRACEVAR  ;EXTERNAL;
00000000 1 PROCEDURE J_TRACEVAR       (PRIMITIVE:PRIMITIVE_PTR; DIRECTION:INT; INITIAL:INT; VAR ERROR:INT);      EXTERNAL;
00000000 1 PROCEDURE J_TRACEMOD       (PRIMITIVE:PRIMITIVE_PTR; DIRECTION:INT; INITIAL:INT; VAR ERROR:INT);      EXTERNAL;
00000000 1 PROCEDURE J_TRACEDATA      (PRIMITIVE:PRIMITIVE_PTR; DIRECTION:INT; INITIAL:INT; VAR ERROR:INT);      EXTERNAL;
00000000 1 PROCEDURE J_TRACESTM       (PRIMITIVE:PRIMITIVE_PTR; DIRECTION:INT; INITIAL:INT; VAR MODE,ERROR:INT); EXTERAML;
00000000 1 #ENDIF
00000000 1 #IF M68000
00000000 1 $PAGE$
00000000 1 $GLOBPROC ON$
00000000 1 (*************************************************************************)
00000000 1 (********** CURRENT_BASE **************************************************)
00000000 1 (*************************************************************************)
00000000 1 (* Procedure to allow access to the current BASE globally              *)
00000000 1 (* This enhancement is only for SODA                                   *)
00000000 1 (*************************************************************************)
00000000 1 (* OUTPUT:
00000000 1 (* BASE is assigned BINARY,OCTAL,DECIMAL,HEXADECIMAL or DEFAULT         *)
00000000 1 (*************************************************************************)
00000000 1 PROCEDURE CURRENT_BASE(VAR BASE:INT);
00000052 2 BEGIN     (* CURRENT_BASE *)
00000052 2  BASE := MONITOR^.BASE;
0000005E 2 END;      (* CURRENT_BASE *)
00000000 1 #ENDIF
00000000 1 $PAGE$
00000000 1 $GLOBPROC OFF$
00000000 1 (*************************************************************************)
00000000 1 (********** FINDMODE  *****************************************************)
00000000 1 (*************************************************************************)
00000000 1 (* Determine if tracestms is in STMTS_ONLY or STMTS_AND_DATA mode       *)
00000000 1 (* STMTS_ONLY if user has requested it by fields to be displayed       *)
00000000 1 (*************************************************************************)
00000000 1 (* OUTPUTS:                                                             *)
00000000 1 (* MODE        STMTS_ONLY or STMTS_AND_DATA                             *)
00000000 1 (*************************************************************************)
00000000 1 PROCEDURE FINDMODE(VAR MODE:INT);
00000000 2 VAR
00000000 2 PTR        :FMT_PTR;              (*POINTS TO THE DISPLAY_FMT*)
00000004 2 I          :INT;
00000066 2
00000066 2 BEGIN (*FIND THE MODE, MIN OR MAX*)
00000066 2 PTR:=MONITOR^.CURRENT_FORMAT; (*PT TO THE DISPLAY_FMT*)
00000070 2 MODE:=STMTS_ONLY; (*ASSUME STMTS_ONLY MODE*)
00000076 2 I:=0;  (*INTIALIZE INDEX TO FIRST FIELD*)
0000007A 2 WHILE PTR^[I].IDENT<>TERMINAT DO
00000090 2   BEGIN
00000090 2   CASE PTR^[I].IDENT OF
000000A0 2     KC9A_FIELD_ABS,KC9A_FIELD_REL,KC9A_FIELD_TIME,
000000A0 2     SYMBOL_FIELD,SYMBOLPATH_FIELD,VALUE_FIELD,STATUS_FIELD: MODE:=STMTS_AND_DATA;
000000AC 2     OTHERWISE;
000000AC 2     END;    (* CASE *)
000000DA 2   I:=I+1;  (*INC INDEX TO NEXT FIELD*)
000000DE 2   END;
000000E0 2 END;
00000000 1 $PAGE$
00000000 1 $GLOBPROC OFF$
00000000 1 (*************************************************************************)
00000000 1 (********** BUILDPRIM *****************************************************)
00000000 1 (*************************************************************************)
00000000 1 (* INPUTS:                                                              *)
00000000 1 (* INITIAL     Initial location in footdc for building next primitive. *)
00000000 1 (* DIRECTION   Direction to move in footdc.                            *)
00000000 1 (*************************************************************************)
00000000 1 (* OUTPUTS:                                                             *)
00000000 1 (* PRIMITIVE      Primitive built by this call to BUILDPRIMITIVE.      *)
00000000 1 (* ERROR          Display system error code.                           *)
00000000 1 (*************************************************************************)
00000000 1 PROCEDURE BUILDPRIM(PRIMITIVE:PRIMITIVE_PTR; DIRECTION:INT; INITIAL:INT; VAR ERROR:INT);
000000E8 2 BEGIN WITH PRIMITIVE^ DO  BEGIN
000000EE 2 STATUS_LINE(STATUS_MESSAGE,2000H,INITIAL);           (*STATUS message, do not stack, clear on new message*)
00000102 2 SYM.LEN                    :=0;                      (*NOTHING IN SYMBOL     STRING*)
```

```
00000108  2  VAL.LEN                               :=0;              (*NOTHING IN VALUE      STRING*)
00000112  2  SYM_PATH.SOURCEFILE_NAME[0]           :=0,              (*Nothing in symbol path*)
0000011C  2  SOURCELINE_PATH.SOURCEFILE_NAME[0]    :=0;              (*Nothing in sourceline path*)
00000126  2  MESSAGE                               :=FALSE;          (*No special message in SYM string*)
0000012E  2  SOURCELINE.LEN                        :=0;              (*NOTHING IN SOURCELINE FMGRBUFF*)
00000136  2  INDENT                                :=0;              (*SET INDENTATION FOR SYMBOL FIELD TO 0*)
0000013E  2  COUNTER                               :=0;              (*INITIALIZE # OF BYTES IN STRUC*)
00000146  2  KC9A[0]                               :=0;              (*IF EOF, NOTHING WILL BE STORED IN KC9A*)
00000150  2  KC9A[1]                               :=0;              (*IF EOF, NOTHING WILL BE STORED IN KC9A*)
0000015C  2  KC9A[2]                               :=0;              (*IF EOF, NOTHING WILL BE STORED IN KC9A*)
00000168  2  KC9A[3]                               :=0;              (*IF EOF, NOTHING WILL BE STORED IN KC9A*)
00000174  2  SOURCELINE_NO                         :=0;              (*IF EOF, NOTHING WILL BE STORED IN SOUCE_NO*)
0000017C  2  STATUS                                :=NONEE;
00000186  2  STARTING                              :=INITIAL;
00000190  2  ENDING                                :=INITIAL;
0000019A  2  #IF M68000
0000019A  2  CASE ENVIRONMENT^.MEASCODE OF  (*********** 68000 ***********************)
000001A8  2    TRACEVARIABLES,
000001A8  2    DISPLAYVARIABLE,
000001A8  2    MODIFYVARIABLE  :TRACEVAR    (PRIMITIVE,DIRECTION,INITIAL,ERROR);
000001CA  2    TRACESTATEMENTS :TRACESTM    (PRIMITIVE,DIRECTION,INITIAL,MODE,ERROR);
000001F0  2    TRACEMODULES    :TRACEMOD    (PRIMITIVE,DIRECTION,INITIAL,ERROR);
00000212  2    TRACEDATA_FLOW  :TRACEDATA   (PRIMITIVE,DIRECTION,INITIAL,ERROR);
00000234  2    TRACEDONTCARE,
00000234  2    DISPLAYBREAK    :TRACEDONT   (PRIMITIVE,DIRECTION,INITIAL,ERROR);
00000256  2    TIMEMODULES     :TIMEMOD     (PRIMITIVE,DIRECTION,INITIAL,ERROR);
00000278  2    COUNTSTATEMENTS :COUNTSTM    (PRIMITIVE,DIRECTION,INITIAL,ERROR);
0000029A  2    OTHERWISE;
0000029A  2    END;
000002D2  2  #ELSE
000002D2  2  CASE ENVIRONMENT^.MEASCODE OF  (********** BPC *************************)
000002D2  2    TRACEVARIABLES,
000002D2  2    DISPLAYVARIABLE,
000002D2  2    MODIFYVARIABLE  :J_TRACEVAR  (PRIMITIVE,DIRECTION,INITIAL,ERROR);
000002D2  2    TRACESTATEMENTS :J_TRACESTM  (PRIMITIVE,DIRECTION,INITIAL,MODE,ERROR);
000002D2  2    TRACEMODULES    :J_TRACEMOD  (PRIMITIVE,DIRECTION,INITIAL,ERROR);
000002D2  2    TRACEDATA_FLOW  :J_TRACEDATA (PRIMITIVE,DIRECTION,INITIAL,ERROR);
000002D2  2    OTHERWISE;
000002D2  2    END;
000002D2  2  #ENDIF
000002D2  2  END; END;
00000000  1  $PAGE$
00000000  1  $GLOBPROC OFF$
00000000  1  (***************************************************************************)
00000000  1  (********** FMTHEADER ******************************************************)
00000000  1  (***************************************************************************)
00000000  1  (* FORMAT COLUMN HEADINGS.                                                 *)
00000000  1  (***************************************************************************)
00000000  1  (* INPUT:                                                                  *)
00000000  1  (* DEST    Pointer to destination for column headings.                     *)
00000000  1  (***************************************************************************)
00000000  1  PROCEDURE FMTHEADER(DEST:STRNG_PTR);
00000000  2
00000000  2  VAR
00000000  2  K            :INT;      (*COUNTS CHARACTER POSITIONS RELATIVE TO START OF LINE *)
00000002  2  M            :INT;      (*NO  OF CHARACTERS OT MOVE*)
00000004  2  I            :INT;      (*INDEX TO FIELD LIST ARRAY*)
00000006  2  WIDTH        :INT;      (*WIDTH OF FIELD EXCLUDING BLANKS ON EACH SIDE*)
00000008  2  SOURCE       :STRNG_PTR;(*PTR TO THE SOURCE STRNG FOR COLUMN HEADING*)
0000000C  2  FOO          :FMT_PTR;  (*POINTS TO THE DISPLAY_FMT*)
00000010  2  E            :CHAR;     (*ENHANCEMENT CHARACTER*)
00000011  2  $PAGE$
000002DA  2  BEGIN
000002DA  2  FOR K:=0  TO MAXCOLUMN DO PUTCHAR(PTR(ADDR(DEST^ ASCII)).K," "); (*CLEAR THE LINE*)
00000300  2  K:=0;  (*INITIALIZE INDEX TO FIRST ASCII BYTE IN STRNG*)
0000030C  2  FOO:=MONITOR^.CURRENT_FORMAT; (*PT TO THE DISPLAY_FMT*)
00000316  2  I:=0;  (*INTIALIZE INDEX TO FIRST FIELD*)
0000031A  2  WHILE FOO^[I].IDENT<>TERMINAT DO
00000330  2    BEGIN  (*FORMAT THE NEXT FIELD*)
00000330  2    WIDTH:=MINN(FOO^[I].WIDTH, MAXCOLUMN-K+1); (*WIDTH of field on virtual screen, may be 0*)
00000356  2    IF WIDTH<>0 THEN
0000035E  2      BEGIN; (*Field width is not zero*)
0000035E  2      CASE FOO^[I].IDENT OF
00000372  2        SYMBOL_FIELD      : SOURCE:=STRNG_PTR(ADDR(NOCO));
```

```
00000380  2        SYMBOLPATH_FIELD : SOURCE:=STRNG_PTR(ADDR(H009));
0000038E  2        VALUE_FIELD      : SOURCE:=STRNG_PTR(ADDR(H001));
0000039C  2        STATUS_FIELD     : SOURCE:=STRNG_PTR(ADDR(H002));
000003AA  2        SOURCE_FIELD     : SOURCE:=STRNG_PTR(ADDR(H007));
000003B8  2        SOURCEPATH_FIELD : SOURCE:=STRNG_PTR(ADDR(H008));
000003C6  2        KC9A_FIELD_ABS   : IF ENVIRONMENT^.KC9A_TIME_FLAG       (*KC9A*)
000003D2  2                           THEN SOURCE:=STRNG_PTR(ADDR(H004)) (*KC9A*)
000003E0  2                           ELSE SOURCE:=STRNG_PTR(ADDR(H006));(*KC9A*)
000003EE  2        KC9A_FIELD_REL   : IF ENVIRONMENT^.KC9A_TIME_FLAG       (*KC9A*)
000003FA  2                           THEN SOURCE:=STRNG_PTR(ADDR(H003)) (*KC9A*)
00000408  2                           ELSE SOURCE:=STRNG_PTR(ADDR(H005));(*KC9A*)
00000416  2        KC9A_FIELD_TIME  : SOURCE:=STRNG_PTR(ADDR(H010));     (*KC9A*)
00000424  2        OTHERWISE;
00000424  2        END; (*END CASE*)
00000454  2      N:=MINN(WIDTH,SOURCE^.LEN); (*Number of characters to move, may be 0*)
0000046A  2      MOVEBYTES(PTR(ADDR(SOURCE^.ASCII)),0, PTR(ADDR(DEST^.ASCII)),K,N);
00000494  2      K:=K+WIDTH; (*K is index to next available location in DEST*)
0000049C  2      IF WIDTH<INT(SOURCE^.LEN) THEN PUTCHAR(PTR(ADDR(DEST^.ASCII)),K-1,"*");
000004C4  2      IF K<=MAXCOLUMN THEN
000004D0  2        BEGIN (*There is room for on or off enhance*)
000004D0  2        IF FOO^[I+1].IDENT<>TERMINAT
000004E8  2          THEN E:=CHAR(0A0H) (*ON ENHANCE*)
000004F2  2          ELSE E:=CHAR(080H);(*OFF ENHANCE*)
000004F8  2        PUTCHAR(PTR(ADDR(DEST^.ASCII)),K,E);
00000512  2        K:=K+1;     (*K is index to next available location in DEST*)
00000516  2        END;  (*There is room for on or off enhance*)
00000516  2      END; (*Field width is not zero*)
00000516  2    I:=I+1;  (*INC INDEX TO NEXT FIELD*)
0000051A  2    END;     (*FORMAT THE NEXT FIELD*)
0000051E  2  DEST^.LEN:=K; (*Save the length of the string*)
00000526  2  END; (*END PROCEDURE*)
00000000  1  $PAGE$
00000000  1  $GLOBPROC OFF$
00000000  1  (*****************************************************************************)
00000000  1  (********** SYMBOL_FIELD *****************************************************)
00000000  1  (*****************************************************************************).
00000000  1  (* INPUTS:                                                                   *)
00000000  1  (* PRIMITIVE   Pts to primitive which is source of ascii to be formated*)
00000000  1  (* TEXT        Dest string for ascii being formatted.                        *)
00000000  1  (* WIDTH       # of characters to be formatted.                              *)
00000000  1  (*             (may be less than # of characters in source ascii).           *)
00000000  1  (*****************************************************************************)
00000000  1  (* OUTPUTS:                                                                  *)
00000000  1  (* TEXT        Dest string after being formatted.                            *)
00000000  1  (*****************************************************************************)
00000000  1  PROCEDURE SYMBOL__FIELD(VAR TEXT:STRNG; WIDTH:INT);
00000000  2  CONST
00000000  2  INDENT_MULTIPLIER =1;           (*Number of leading spaces for each level of indentation*)
00000000  2  VAR
00000000  2  K            :INT;              (*Byte index into TEXT.ASCII*)
00000002  2  S            :INT;              (*Number of leading spaces to move*)
00000004  2  J            :INT;              (*counter for moving spaces*)
00000006  2  N            :INT;              (*Number of characters to move*)
0000052E  2
0000052E  2  BEGIN WITH PRIMITIVE^ DO BEGIN
00000534  2  K:=TEXT.LEN;
0000053C  2  S:=INDENT*INDENT_MULTIPLIER;                                   (*COMPUTE # OF LEADING SPACES*)
0000054C  2  S:=MINN(S,WIDTH);
0000055E  2  FOR J:=0 TO S-1 DO PUTCHAR(PTR(ADDR(TEXT.ASCII)), J+K, " ");     (*MOVE S  # OF LEADING SPACES*)
000005A6  2
000005A6  2  N:=MINN(SYM.LEN,WIDTH-S);                                      (*COMPUTE # OF CHARACTERS*)
000005C4  2  MOVEBYTES (PTR(ADDR(SYM.ASCII)),0, PTR(ADDR(TEXT.ASCII)),K+S, N);     (*MOVE N  # OF CHARACTERS*)
000005F4  2  IF WIDTH<SYM.LEN+S THEN  PUTCHAR(PTR(ADDR(TEXT.ASCII)),K+WIDTH-1,"*");  (*CHECK FOR OVARFLOW*)
0000062A  2  END;END;
00000000  1  $PAGE$
00000000  1  $GLOBPROC OFF$
00000000  1  (*****************************************************************************)
00000000  1  (********** PATH_FIELD (symbol paths and source paths) *******************)
00000000  1  (*****************************************************************************)
00000000  1  (* INPUTS:                                                                   *)
00000000  1  (* PRIMITIVE   Pts to primitive which is source of ascii to be formated*)
00000000  1  (* TEXT        Dest string for ascii being formatted.                        *)
00000000  1  (* WIDTH       # of characters to be formatted.                              *)
00000000  1  (*             (may be less than # of characters in source ascii).           *)
```

```
00000000 1 (* PATH       SYM_PATH or SOURCE_PATH from PRIMITIVE.                        *)
00000000 1 (***************************************************************************)
00000000 1 (* OUTPUTS:                                                                  *)
00000000 1 (* TEXT       Dest string after being formatted.                             *)
00000000 1 (***************************************************************************)
00000000 1 PROCEDURE PATH__FIELD(VAR TEXT:STRNG; WIDTH:INT; VAR PATH:PATH_TYPE);
00000000 2 TYPE
00000000 2 TEMPARRAY    =ARRAY[0..17] OF INT;
00000000 2 TEMPARRAYPTR =^TEMPARRAY;
00000000 2 VAR
00000000 2 K            :INT;                  (*Byte index into TEXT.ASCII*)
00000002 2 TEMP         :TEMPARRAYPTR;
00000006 2 I            :INT;                  (*Number of characters in path*)
00000008 2 J            :INT;                  (*counter for moving spaces*)
0000000A 2 N            :INT;                  (*Number of characters to move*)
0000000C 2 DESTSIZE     :INT;                  (*Number of characters to move*)
00000632 2
00000632 2 BEGIN WITH PRIMITIVE^ DO BEGIN
00000638 2 IF (PATH.SOURCEFILE_NAME[0]<>0) AND (PATH.SOURCEFILE_NAME[0]<>20H) THEN
00000656 2   BEGIN (*There is path information*)
00000656 2   K:=TEXT.LEN;
0000065E 2   NEW(TEMP);
00000670 2   I:=0;  (*no characters in path*)
00000674 2   IF (PATH.PROC_NAME[0]<>0) AND (PATH.PROC_NAME[0]<>20H) THEN
0000069A 2     BEGIN (*There is a proc name*)
0000069A 2     IF PATH.PROC_NAME[0]=-1
000006A8 2       THEN BEGIN PUTCHAR(PTR(TEMP),I,"?"); J:=1; END (*There should be a proc name but there isnt*)
000006C6 2       ELSE FMTSYMBOL(PTR(ADDR(PATH.PROC_NAME)),PTR(TEMP),I,J);
000006E8 2     I:=I+J;
000006F0 2     PUTCHAR(PTR(TEMP),I,":");
00000704 2     I:=I+1;
00000708 2     END;  (*There is a proc name*)
00000708 2   FMTFILE(PTR(ADDR(PATH.SOURCEFILE_NAME)),PTR(TEMP),I,J);
00000726 2   I:=I+J;
0000072E 2   IF PATH.SOURCEFILE_DISC<>0  THEN
0000073A 2     BEGIN
0000073A 2     PUTCHAR(PTR(TEMP),I,":");
0000074E 2     I:=I+1;
00000752 2     DESTSIZE:=1;
00000758 2     FORMAT(UNSIGNED,PTR(ADDR(PATH.SOURCEFILE_DISC)),2,PTR(TEMP),I,DESTSIZE,10,LEFT);
00000788 2     I:=I+1;
0000078C 2     END;
0000078C 2
0000078C 2   N:=MINN(I,WIDTH);                                    (*COMPUTE # OF CHARACTERS*)
000007A0 2   MOVEBYTES (PTR(TEMP),0, PTR(ADDR(TEXT.ASCII)),K, N);    (*MOVE N  # OF CHARACTERS*)
000007C4 2   IF WIDTH<I THEN  PUTCHAR(PTR(ADDR(TEXT.ASCII)),K+WIDTH-1,"*");          (*CHECK FOR OVERFLOW*)
000007F0 2   DISPOSE(TEMP);
00000802 2   END;  (*There is path information*)
00000802 2 END;END;
00000000 1 $PAGE$
00000000 1 $GLOBPROC OFF$
00000000 1 (***************************************************************************)
00000000 1 (********** VALUE__FIELD ***************************************************)
00000000 1 (***************************************************************************)
00000000 1 (* INPUTS:                                                                   *)
00000000 1 (* PRIMITIVE  Pts to primitive which is source of ascii to be formated*)
00000000 1 (* TEXT       Dest string for ascii being formatted.                         *)
00000000 1 (* WIDTH      # of characters to be formatted.                               *)
00000000 1 (*            (may be less than # of characters in source ascii).            *)
00000000 1 (***************************************************************************)
00000000 1 (* OUTPUTS:                                                                  *)
00000000 1 (* TEXT       Dest string after being formatted.                             *)
00000000 1 (***************************************************************************)
00000000 1 PROCEDURE VALUE__FIELD(VAR TEXT:STRNG; WIDTH:INT);
00000000 2 VAR
00000000 2 K            :INT;                  (*Byte index into TEXT.ASCII*)
00000002 2 N            :INT;                  (*Number of characters to move*)
0000080A 2
0000080A 2 BEGIN WITH PRIMITIVE^ DO BEGIN
00000810 2 K:=TEXT.LEN;
00000818 2 N:=MINN(WIDTH, VAL.LEN);                              (*COMPUTE # OF CHARACTERS*)
00000830 2 MOVEBYTES(PTR(ADDR(VAL.ASCII)),0, PTR(ADDR(TEXT.ASCII)),K+WIDTH-N,N); (*MOVE N  # OF CHARACTERS RIGHT JUSTIFY*)
00000864 2 IF WIDTH<VAL.LEN THEN PUTCHAR(PTR(ADDR(TEXT.ASCII)),K+WIDTH-1,"*");       (*CHECK FOR OVERFLOW*)
00000894 2 END; END;
00000000 1 $PAGE$
```

```
00000000 1  $GLOBPROC OFF$
00000000 1  (*************************************************************************)
00000000 1  (********** STATUS__FIELD **************************************************)
00000000 1  (*************************************************************************)
00000000 1  (* INPUTS:                                                               *)
00000000 1  (* PRIMITIVE   Pts to primitive which is source of ascii to be formated*)
00000000 1  (* TEXT        Dest string for ascii being formatted.                    *)
00000000 1  (* WIDTH       # of characters to be formatted.                          *)
00000000 1  (*             (may be less than # of characters in source ascii).       *)
00000000 1  (*************************************************************************)
00000000 1  (* OUTPUTS:                                                              *)
00000000 1  (* TEXT        Dest string after being formatted.                        *)
00000000 1  (*************************************************************************)
00000000 1  PROCEDURE STATUS__FIELD(VAR TEXT:STRNG; WIDTH:INT);
00000000 2  VAR
00000000 2  K            :INT;                 (*Byte index into TEXT.ASCII*)
00000002 2  J            :INT;
00000004 2  N            :INT;                 (*Number of characters to move*)
00000006 2  S            :STRNG_PTR;            (*Ptr to STRNG containing status*)
0000089C 2
0000089C 2  BEGIN WITH PRIMITIVE^ DO BEGIN
000008A2 2  K:=TEXT.LEN;
000008AA 2  PUTCHAR(PTR(ADDR(TEXT.ASCII)),K," ");  (*BLANK CHAR BEFORE STATUS FIELD*)
000008C4 2  CASE STATUS OF (*GET ADDRESS OF SOURCE STRNG*)
000008D2 2    READD      :S:=STRNG_PTR(ADDR(F000));  (*"read"*)
000008E0 2    WRITEE     :S:=STRNG_PTR(ADDR(F001));  (*"write"*)
000008EE 2    ENTRYY     :S:=STRNG_PTR(ADDR(F002));  (*"entry"*)
000008FC 2    EXITT      :S:=STRNG_PTR(ADDR(F003));  (*"exit"*)
0000090A 2    NONEE      :S:=STRNG_PTR(ADDR(F004));  (*" "*)
00000918 2    OTHERWISE  ;
00000918 2    END;
00000940 2  N:=MINN(S^.LEN, WIDTH);                                  (*COMPUTE # OF CHARACTERS*)
00000956 2  MOVEBYTES(PTR(ADDR(S^.ASCII)),0, PTR(ADDR(TEXT.ASCII)),K,N);         (*MOVE N  # OF CHARACTERS*)
00000980 2  IF WIDTH<S^.LEN THEN PUTCHAR(PTR(ADDR(TEXT.ASCII)),K+WIDTH-1,"*");(*CHECK FOR OVERFLOW*)
000009AE 2  END; END;
00000000 1  $PAGE$
00000000 1  $GLOBPROC OFF$
00000000 1  (*************************************************************************)   (*KC9A*)(*KC9A*)
00000000 1  (********** KC9A__FIELD ****************************************************)   (*KC9A*)(*KC9A*)
00000000 1  (*************************************************************************)   (*KC9A*)(*KC9A*)
00000000 1  (* INPUTS:                                                               *)
00000000 1  (* PRIMITIVE   Pts to primitive which is source of ascii to be formated*)
00000000 1  (* TEXT        Dest string for ascii being formatted.                    *)
00000000 1  (* WIDTH       # of characters to be formatted.                          *)
00000000 1  (*             (may be less than # of characters in source ascii).       *)
00000000 1  (*************************************************************************)
00000000 1  (* OUTPUTS:                                                              *)
00000000 1  (* TEXT        Dest string after being formatted.                        *)
00000000 1  (*************************************************************************)
00000000 1  PROCEDURE KC9A__FIELD(VAR TEXT:STRNG; WIDTH:INT; BASE:INT;                    (*KC9A*)(*KC9A*)
00000000 2                     TRIG_KC9A,PREV_KC9A:KC9A_TAG);                           (*KC9A*)(*KC9A*)
00000000 2  CONST                                                                       (*KC9A*)(*KC9A*)
00000000 2  CHARCOUNT   =9;               (*FMTKC9A always formats 9 characters*)       (*KC9A*)(*KC9A*)
00000000 2  TYPE                                                                        (*KC9A*)(*KC9A*)
00000000 2  TEMP_ARRAY  =ARRAY[0..4] OF INT; (*Array for formatting KC9A count*)        (*KC9A*)(*KC9A*)
00000000 2  VAR                                                                         (*KC9A*)(*KC9A*)
00000000 2  TEMP        :TEMP_ARRAY;      (*Array for formatting KC9A count*)           (*KC9A*)(*KC9A*)
0000000A 2  K           :INT;             (*Byte index into TEXT.ASCII*)                (*KC9A*)(*KC9A*)
0000000C 2  N           :INT;             (*Number of characters to move*)              (*KC9A*)(*KC9A*)
0000000E 2  BASE_KC9A   :KC9A_TAG;        (*ABS==>TRIG_KC9A, REL==> PREV_KC9A*)         (*KC9A*)(*KC9A*)
000009CE 2                                                                              (*KC9A*)(*KC9A*)
000009CE 2  BEGIN  WITH PRIMITIVE^ DO BEGIN                                             (*KC9A*)(*KC9A*)
000009D4 2  K:=TEXT.LEN;                                                                (*KC9A*)(*KC9A*)
000009DC 2  IF BASE=ABSOLUTE                                                            (*KC9A*)(*KC9A*)
000009E4 2    THEN BASE_KC9A:=TRIG_KC9A                                                 (*KC9A*)(*KC9A*)
000009F4 2    ELSE BASE_KC9A:=PREV_KC9A;                                                (*KC9A*)(*KC9A*)
00000A00 2  FMTKC9A(ENVIRONMENT^.KC9A_TIME_FLAG,PTR(ADDR(TEMP)),0,BASE_KC9A,KC9A);      (*KC9A*)(*KC9A*)
00000A28 2  N:=MINN(WIDTH,CHARCOUNT);              (*COMPUTE # OF CHARACTERS*)          (*KC9A*)(*KC9A*)
00000A3C 2  MOVEBYTES(PTR(ADDR(TEMP)),0,PTR(ADDR(TEXT.ASCII)),K,N);                     (*KCPA*)(*KC9A*)
00000A62 2  IF WIDTH<CHARCOUNT THEN PUTCHAR(PTR(ADDR(TEXT.ASCII)),K+WIDTH-1,"*");       (*KC9A*)(*KC9A*)
00000A8E 2  END; END;                                                                   (*KC9A*)(*KC9A*)
00000000 1  $PAGE$
00000000 1  $GLOBPROC OFF$
00000000 1  (*************************************************************************)   (*KC9A*)(*KC9A*)
```

```
00000000 1 (********** KC9A__TIME ****************************************************)   (*KC9A*)(*KC9A*)
00000000 1 (************************************************************************)   (*KC9A*)(*KC9A*)
00000000 1 (* INPUTS:                                                              *)
00000000 1 (* PRIMITIVE   Pts to primitive which is source of ascii to be formated*)
00000000 1 (* TEXT        Dest string for ascii being formatted.                   *)
00000000 1 (* WIDTH       # of characters to be formatted.                         *)
00000000 1 (*             (may be less than # of characters in source ascii).      *)
00000000 1 (************************************************************************)
00000000 1 (* OUTPUTS:                                                             *)
00000000 1 (* TEXT        Dest string after being formatted.                       *)
00000000 1 (************************************************************************)
00000000 1 PROCEDURE KC9A__TIME(VAR TEXT:STRNG; WIDTH:INT);                               (*KC9A*)(*KC9A*)
00000000 2 CONST                                                                          (*KC9A*)(*KC9A*)
00000000 2 CHARCOUNT  =36;                   (*FMTKC9A always formats 9 characters*)      (*KC9A*)(*KC9A*)
00000000 2 TYPE                                                                           (*KC9A*)(*KC9A*)
00000000 2 TEMP_ARRAY  =ARRAY[0..35] OF INT; (*Array for formatting KC9A counts*)         (*KC9A*)(*KC9A*)
00000000 2 VAR                                                                            (*KC9A*)(*KC9A*)
00000000 2 TEMP       :TEMP_ARRAY;          (*Array for formatting KC9A count*)           (*KC9A*)(*KC9A*)
00000048 2 K          :INT;                 (*Byte index into TEXT.ASCII*)                (*KC9A*)(*KC9A*)
0000004A 2 M          :INT;                 (*Number of characters to move*)              (*KC9A*)(*KC9A*)
0000004C 2 DESTSIZE   :INT;                 (*Number of characters to FORMAT*)            (*KC9A*)(*KC9A*)
0000004E 2 BASE_KC9A  :KC9A_TAG;            (*ABS==>TRIG_KC9A, REL==> PREV_KC9A*)         (*KC9A*)(*KC9A*)
00000A96 2                                                                                (*KC9A*)(*KC9A*)
00000A96 2 BEGIN  WITH PRIMITIVE^ DO BEGIN                                                (*KC9A*)(*KC9A*)
00000A9C 2 FOR N := 0 TO 3 DO                                                             (*KC9A*)(*KC9A*)
00000AA0 2     BASE_KC9A[N] := 0;                                                         (*KC9A*)(*KC9A*)
00000ABE 2 FMTKC9A(TRUE,PTR(ADDR(TEMP)),0,BASE_KC9A,KC9A_MIN):                            (*KC9A*)(*KC9A*)
00000AE2 2 PUTCHAR(PTR(ADDR(TEMP)),9," ");                                                (*KC9A*)(*KC9A*)
00000AF8 2 FMTKC9A(TRUE,PTR(ADDR(TEMP)),10,BASE_KC9A,KC9A_MAX);                           (*KC9A*)(*KC9A*)
00000B1E 2 PUTCHAR(PTR(ADDR(TEMP)),19," ");                                               (*KC9A*)(*KC9A*)
00000B34 2 FMTKC9A(TRUE,PTR(ADDR(TEMP)),20,BASE_KC9A,KC9A);                               (*KC9A*)(*KC9A*)
00000B5A 2 PUTCHAR(PTR(ADDR(TEMP)),29," ");                                               (*KC9A*)(*KC9A*)
00000B70 2 DESTSIZE:=6;                                                                   (*KC9A*)(*KC9A*)
00000B76 2 FORMAT(SIGNED,PTR(ADDR(KC9A_COUNT)),2,PTR(ADDR(TEMP)),30,DESTSIZE,10,RIGHT);   (*KC9A*)(*KC9A*)
00000BAA 2 K:=TEXT.LEN;                                                                   (*KC9A*)(*KC9A*)
00000BB2 2 M:=MINM(WIDTH,CHARCOUNT);             (*COMPUTE # OF CHARACTERS*)              (*KC9A*)(*KC9A*)
00000BC6 2 MOVEBYTES(PTR(ADDR(TEMP)),0,PTR(ADDR(TEXT.ASCII)),K,M);                        (*KCPA*)(*KC9A*)
00000BEC 2 IF WIDTH<CHARCOUNT THEN PUTCHAR(PTR(ADDR(TEXT.ASCII)),K+WIDTH-1,"*");          (*KC9A*)(*KC9A*)
00000C18 2 END; END;                                                                      (*KC9A*)(*KC9A*)
00000000 1 $PAGE$
00000000 1 $GLOBPROC OFF$
00000000 1 (************************************************************************)
00000000 1 (********** SOURCE__FIELD**************************************************)
00000000 1 (************************************************************************)
00000000 1 (* INPUTS:                                                              *)
00000000 1 (* PRIMITIVE   Pts to primitive which is source of ascii to be formated*)
00000000 1 (*             SOURCELINE[0] =0 ==> do not format source line field.    *)
00000000 1 (*             SOURCELINE_NO:                                           *)
00000000 1 (*                -2 ==>  "Program execution outside of absolute ..."   *)
00000000 1 (*                -1 ==>  "File not found, file= xxx:comp_db ..."       *)
00000000 1 (*                 0 ==>  "No source line found ..."                    *)
00000000 1 (*                >0 ==>   real source line, not an error mesage        *)
00000000 1 (* TEXT        Dest string for ascii being formatted.                   *)
00000000 1 (* WIDTH       # of characters to be formatted.                         *)
00000000 1 (*             (may be less than # of characters in source ascii).      *)
00000000 1 (************************************************************************)
00000000 1 (* OUTPUTS:                                                             *)
00000000 1 (* TEXT        Dest string after being formatted.                       *)
00000000 1 (************************************************************************)
00000000 1 PROCEDURE SOURCE__FIELD(VAR TEXT:STRNG; WIDTH:INT);
00000000 2 VAR
00000000 2 K           :INT;              (*Byte index into TEXT.ASCII*)
00000002 2 DESTSIZE    :INT;              (*Number of characters to FORMAT*)
00000004 2 M           :INT;              (*Number of characters to move*)
00000006 2 J           :INT;
00000C20 2
00000C20 2 BEGIN WITH PRIMITIVE^ DO BEGIN
00000C26 2 K:=TEXT.LEN;
00000C2E 2 IF PRIMITIVE^.SOURCELINE.LEN<>0 THEN
00000C3A 2   BEGIN
00000C3A 2   (*Format SOURCELINE_NO: 0==> error,  format "????" in place of SOURCELINE_NO.*)
00000C3A 2   DESTSIZE:=4;  (*FORMAT AT MOST 4 CHARACTERS*)
00000C40 2   IF SOURCELINE_NO<=0
00000C4C 2     THEN FOR J:=0 TO 3 DO PUTCHAR(PTR(ADDR(TEXT.ASCII)),K+J, "?")
```

```
00000C84  2      ELSE FORMAT(UNSIGNED,PTR(ADDR(SOURCELINE_NO)),2,PTR(ADDR(TEXT.ASCII)),K,DESTSIZE,10,RIGHT);
00000CBC  2    FOR J:=WIDTH TO DESTSIZE DO PUTCHAR(PTR(ADDR(TEXT.ASCII)),K+J," "); (*BLANK ANY STUFF FORMATTED PAST WIDTH*)
00000D04  2
00000D04  2    (*Format SOURCELINE: SOURCELINE_NO=0 ==> SOURCELINE has error message.*)
00000D04  2    N:=MINN(WIDTH-5,SOURCELINE.LEN);                          (*COMPUTE # OF CHARACTERS*)
00000D20  2    MOVEBYTES(PTR(ADDR(SOURCELINE.ASCII)),0, PTR(ADDR(TEXT.ASCII)),K+5, N); (*MOVE N  # OF CHARACTERS*)
00000D4E  2    IF WIDTH<SOURCELINE.LEN+5 THEN PUTCHAR(PTR(ADDR(TEXT.ASCII)),K+WIDTH-1,"*");      (*CHECK FOR OVERFLOW*)
00000D82  2    END;
00000D82  2  END; END;
00000000  1  $PAGE$
00000000  1  $GLOBPROC OFF$
00000000  1  (*******************************************************************)
00000000  1  (********** FMTLINE ************************************************)
00000000  1  (*******************************************************************)
00000000  1  (* FORMAT ONE LINE OF SODA DISPLAY.                                *)
00000000  1  (* THIS PUPPY CANT DO ANYTHING WITHOUT LOOKING AT THE PREVIOUS LINE OR *)
00000000  1  (* NEXT LINE TO FIGURE OUT WHERE TO START THE CURRENT LINE (NEWLINE).  *)
00000000  1  (* WHEN DIRECTION=BKWD, FORMATTING THE CURRENT LINE REQUIRES THAT      *)
00000000  1  (* FMTLINE ALSO BUILD THE PRIMITIVE FOR THE PREVIOUS LINE IN ORDER TO  *)
00000000  1  (* DETERMINE WHETHER TO DISPLAY THE SOURCE LINE IF MEASURMENT=TRACESTM *)
00000000  1  (* AND TO FIND PREVIOUS KC9A COUNTS FOR COUNT RELETIVE.              *)
00000000  1  (*******************************************************************)
00000000  1  (* INPUTS:                                                         *)
00000000  1  (* NEWLINE      LINE_DISCRIPTOR for line to be formatted.           *)
00000000  1  (* REFLINE      LINE_DISCRIPTOR for line before or after NEWLINE.    *)
00000000  1  (* DIRECTION    Direction of movement in acquisition data.          *)
00000000  1  (*******************************************************************)
00000000  1  (* OUTPUTS:                                                        *)
00000000  1  (* ERROR             Display system error code.                     *)
00000000  1  (*******************************************************************)
00000000  1  PROCEDURE FMTLINE(VAR NEWLINE,REFLINE: LINE_DISCRIPTOR; DIRECTION:INT; VAR ERROR:INT);
00000000  2  LABEL 1;
00000000  2
00000000  2  VAR
00000000  2  I              :INT;                 (*GENERAL INDEX*)
00000002  2  WIDTH          :INT;                 (*WIDTH OF FIELD EXCLUDING BLANKS ON EACH SIDE*)
00000004  2  SOURCE         :STRNG_PTR;           (*PTR TO SOURCE STRNG FOR STATUS FIELD*)
00000008  2  TEMP           :PRIMITIVE_PTR;       (*TEMPORARY FOR CHANGING PRIMITIVE TO HOLD_PRIMITIVE*)
0000000C  2  FOO            :FMT_PTR;             (*POINTS TO THE DISPLAY_FMT*)
00000D8A  2
00000D8A  2  BEGIN
00000D8A  2  (********** TWO PRIMITIVE STUFF FOR RELATIVE TIMES BACKWARD ************)
00000D8A  2  IF DIRECTION=FWD THEN
00000D92  2    BEGIN (*FORWARD FORWARD*)
00000D92  2    HOLD:=FALSE;  (*HOLD_PRIMITIVE IS EMPTY*)
00000D96  2    BUILDPRIM (PRIMITIVE,DIRECTION,REFLINE.ENDING,ERROR);
00000DB8  2    IF ERROR<>0 THEN GOTO 1;
00000DC6  2    END   (*FORWARD FORWARD*)
00000DCA  2
00000DCA  2    ELSE
00000DCA  2    BEGIN (*BACKWARD BACKWARD*)
00000DCA  2    IF HOLD
00000DD2  2      THEN BEGIN TEMP:=PRIMITIVE; PRIMITIVE:=HOLD_PRIMITIVE; HOLD_PRIMITIVE:=TEMP; END
00000DE8  2      ELSE BUILDPRIM (PRIMITIVE,DIRECTION,REFLINE.STARTING,ERROR);
00000E0A  2    IF ERROR<> 0 THEN GOTO 1;
00000E18  2    BUILDPRIM (HOLD_PRIMITIVE,DIRECTION,PRIMITIVE^.STARTING,ERROR);
00000E3A  2    IF ERROR<>0 THEN
00000E44  2      BEGIN (*ERROR IN BUILDING HOLD_PRIMITIVE*)
00000E44  2      HOLD:=FALSE;
00000E48  2      ERROR:=0
00000E4E  2      END   (*ERROR IN BUILDING HOLD_PRIMITIVE*)
00000E52  2      ELSE
00000E52  2      BEGIN (*NO ERROR IN BUILDING HOLD_PRIMITIVE*)
00000E52  2      HOLD:=TRUE;
00000E58  2      END;  (*NO ERROR IN BUILDING HOLD_PRIMITIVE*)
00000E58  2    END;  (*BACKWARD BACKWARD*)
00000E58  2  (********** SAVE GENERAL STUFF FROM PRIM IN BIGBUFF ******************)
00000E58  2  WITH NEWLINE DO
00000E60  2    BEGIN (*WITH BIGBUFF[NEWLINE]*)
00000E60  2    SOURCELINE_NO     :=PRIMITIVE^.SOURCELINE_NO;
00000E6A  2    STARTING          :=PRIMITIVE^.STARTING;
00000E78  2    ENDING            :=PRIMITIVE^.ENDING;
00000E86  2    STATUS            :=PRIMITIVE^.STATUS;
00000E94  2    KC9A              :=PRIMITIVE^.KC9A;        (*KC9A*)
```

```
00000EA8  2    IF DIRECTION=FWD                            (*KC9A*)
00000EB0  2      THEN PREV_KC9A  :=REFLINE.KC9A            (*KC9A*)
00000EC8  2      ELSE PREV_KC9A  :=HOLD_PRIMITIVE^.KC9A;   (*KC9A*)
00000EDC  2    END; (*WITH BIGBUFF[NEWLINE*)
00000EDC  2
00000EDC  2  (********** SPECIAL PATCH FOR SOURCE LINE IN TRACESTATMENTS ************)
00000EDC  2  (********** TO AVOID REPRODUCING A LINE ALREADY CAPTURED     ************)
00000EDC  2  (********** FOR SODA - PLACE " IN PLACE OF REPEATING LINE    ************)
00000EDC  2  IF ENVIRONMENT^.MEASCODE=TRACESTATEMENTS THEN
00000EEC  2    IF MODE=STMTS_AND_DATA THEN
00000EF8  2      IF NOT PRIMITIVE^.MESSAGE THEN
00000F04  2        IF NEWLINE.SOURCELINE_NO<>0  THEN WITH PRIMITIVE^ DO
00000F16  2          CASE DIRECTION OF
00000F20  2          FWD:  IF NEWLINE.SOURCELINE_NO=REFLINE.SOURCELINE_NO THEN
00000F34  2                BEGIN
00000F34  2  #IF M68000
00000F34  2                MOVEBYTES(PTR(ADDR(M001)),0,PTR(ADDR(SOURCELINE)),0,M001.LEN+2);
00000F60  2  #ELSE
00000F60  2                SOURCELINE.LEN := 0;
00000F60  2  #ENDIF
00000F60  2                SOURCELINE_PATH.SOURCEFILE_NAME[0]:=0;
00000F6A  2                END;
00000F6E  2          BKWD. IF NEWLINE.SOURCELINE_NO=HOLD_PRIMITIVE^.SOURCELINE_NO  THEN
00000F82  2                BEGIN
00000F82  2  #IF M68000
00000F82  2                MOVEBYTES(PTR(ADDR(M001)),0,PTR(ADDR(SOURCELINE)),0,M001.LEN+2);
00000FAE  2  #ELSE
00000FAE  2                SOURCELINE.LEN := 0;
00000FAE  2  #ENDIF
00000FAE  2                SOURCELINE_PATH.SOURCEFILE_NAME[0]:=0;
00000FB8  2                END;
00000FBC  2          OTHERWISE;
00000FBC  2          END; (*END CASE*)
00000FDE  2  $PAGE$
00000FDE  2  (********** FORMAT "TEXT" FIELD OF THE LINE *****************************)
00000FDE  2  WITH PRIMITIVE^,NEWLINE DO BEGIN
00000FEC  2  FOR I:=0  TO MAXCOLUMN DO PUTCHAR(PTR(ADDR(TEXT.ASCII)),I," "); (*CLEAR THE LINE*)
0000101A  2  IF MESSAGE THEN
00001026  2    BEGIN (*SPECIAL MESSAGE PRIMITIVE SPECIAL MESSAGE IS IN PRIMITIVE.SYM*)
00001026  2    WIDTH:=MAXCOLUMN;
0000102C  2    TEXT.LEN:=MINM(SYM.LEN,WIDTH);  (*COMPUTE # OF CHARACTERS TO MOVE*)
0000104E  2    MOVEBYTES(PTR(ADDR(SYM)),0, PTR(ADDR(TEXT)),0, TEXT.LEN+2);
0000107A  2    IF WIDTH<SYM.LEN THEN PUTCHAR(PTR(ADDR(TEXT.ASCII)),TEXT.LEN-1,"*");
000010A8  2    END   (*SPECIAL MESSAGE PRIMITIVE*)
000010AC  2
000010AC  2    ELSE
000010AC  2    BEGIN (*IT IS A NORMAL PRIMITIVE*)
000010AC  2    FOO:=MONITOR^.CURRENT_FORMAT; (*PT TO THE DISPLAY_FMT*)
000010B6  2    TEXT.LEN:=0;  (*INITIALIZE TO NO CHARACTERS IN TEXT STRNG*)
000010BE  2    I:=0;  (*INTIALIZE INDEX TO FIRST FIELD*)
000010C2  2    WHILE FOO^[I].IDENT<>TERMINAT DO
000010D3  2      BEGIN  (*FORMAT THE NEXT FIELD*)
000010D8  2      WIDTH:=MINM(FOO^[I].WIDTH,MAXCOLUMN-TEXT.LEN+1); (*DONT GO PAST LAST COLMN*)
00001102  2      IF WIDTH>0 THEN
0000110A  2        BEGIN (*Field width is not zero*)
0000110A  2        CASE FOO^[I].IDENT OF
0000111E  2          STATUS_FIELD      :STATUS__FIELD     (TEXT,WIDTH);
00001136  2          SYMBOL_FIELD      :SYMBOL__FIELD     (TEXT,WIDTH);
0000114E  2          VALUE_FIELD       :VALUE__FIELD      (TEXT,WIDTH);
00001166  2          SOURCE_FIELD      :SOURCE__FIELD     (TEXT,WIDTH);
0000117E  2          SYMBOLPATH_FIELD  :PATH__FIELD       (TEXT,WIDTH,PRIMITIVE^.SYM_PATH);
000011A2  2          SOURCEPATH_FIELD  :PATH__FIELD       (TEXT,WIDTH,PRIMITIVE^.SOURCELINE_PATH);
000011C6  2          KC9A_FIELD_ABS    :KC9A__FIELD       (TEXT,WIDTH,ABSOLUTE,TRIG_KC9A,PREV_KC9A);  (*KC9A*)
000011EC  2          KC9A_FIELD_REL    :KC9A__FIELD       (TEXT,WIDTH,RELETIVE,TRIG_KC9A,PREV_KC9A);  (*KC9A*)
00001214  2          KC9A_FIELD_TIME   :KC9A__TIME        (TEXT,WIDTH);                               (*KC9A*)
0000122C  2          OTHERWISE;
0000122C  2          END; (*END CASE*)
0000125C  2        TEXT.LEN:=TEXT.LEN+WIDTH;
0000126C  2        IF TEXT.LEN<=MAXCOLUMN THEN TEXT.LEN:=TEXT.LEN+1;
00001286  2        END;  (*Field width is not zero*)
00001286  2      I:=I+1;  (*INC INDEX TO NEXT FIELD*)
0000128A  2      END;     (*FORMAT THE NEXT FIELD*)
0000128E  2    END;  (*IT IS A NORMAL PRIMITIVE*)
0000128E  2  1:END;END; (*END WITH PRIMITIVE*) (*END PROCEDURE*)
00000000  1  $PAGE$
```

```
00000000  1  $GLOBPROC OFF$
00000000  1  (***************************************************************************)
00000000  1  (********** EOF_CLEAR_LINE****************************************************)
00000000  1  (***************************************************************************)
00000000  1  (* A call to FMTLINE has returned an eof.  EOF_CLEAR_LINE will blank   *)
00000000  1  (* the TEXT of the line and set START and STOP to their eof values.     *)
00000000  1  (***************************************************************************)
00000000  1  (* INPUTS:                                                               *)
00000000  1  (* NEWLINE     LINE_DISCRIPTOR for line to be formatted.                 *)
00000000  1  (* DIRECTION   Direction of movement in acquisition data.                *)
00000000  1  (***************************************************************************)
00000000  1  (* OUTPUTS:                                                              *)
00000000  1  (* NEWLINE     LINE_DISCRIPTOR for line to be formatted.                 *)
00000000  1  (***************************************************************************)
00000000  1  PROCEDURE EOF_CLEAR_LINE(VAR NEWLINE:LINE_DISCRIPTOR; DIRECTION:INT);
00000000  2  VAR
00000000  2  K       :INT;
00000002  2  REC_NO  :INT;
00000004  2  ERROR   :INT;  (*Error flag if dcb not found in GET_REC_NUM*)
00001296  2  BEGIN
00001296  2  FOR K:=0 TO MAXCOLUMN DO PUTCHAR(PTR(ADDR(NEWLINE.TEXT.ASCII)),K," ");
000012C4  2  IF DIRECTION=FWD THEN
000012CC  2    BEGIN
000012CC  2    GET_REC_NUM(REC_NO);
000012D8  2    ENVIRONMENT^.LAST_POSITION:=(REC_NO-ENVIRONMENT^.FIRST_DATA_REC)*2;
000012EC  2    NEWLINE.STARTING:=ENVIRONMENT^.LAST_POSITION;
000012FA  2    NEWLINE.ENDING  :=ENVIRONMENT^.LAST_POSITION;
00001308  2    END
0000130C  2    ELSE
0000130C  2    BEGIN
0000130C  2    NEWLINE.STARTING:=0;
00001314  2    NEWLINE.ENDING  :=0;
0000131C  2    END;
0000131C  2  END;
00000000  1  $PAGE$
00000000  1  $GLOBPROC OFF$
00000000  1  (***************************************************************************)
00000000  1  (*********** ALIGN ************************************************************)
00000000  1  (***************************************************************************)
00000000  1  (* The REQ_POSITION is a random location and may not be aligned on a    *)
00000000  1  (* primitive boundary.  This routine aligns the requested postion and   *)
00000000  1  (* returns a NEWLINE with a starting position equal to the aligned      *)
00000000  1  (* REQ_POSTION.  The algorithm works forward from the requested         *)
00000000  1  (* position then backward from the end of the line just found.  The     *)
00000000  1  (* result is a line that starts on a primitive boundary.                *)
00000000  1  (*     FMTLINE backward builds the required primitive plus the preceding*)
00000000  1  (* primitive.  This is to find the previous KC9A count for computing    *)
00000000  1  (* reletive KC9A counts.  The net result as far as ALIGN is concerned   *)
00000000  1  (* is that the aligned NEWLINE that is returned has the correct         *)
00000000  1  (* PREV_KC9A as well as being aligned.                                   *)
00000000  1  (***************************************************************************)
00000000  1  (* INPUTS:                                                               *)
00000000  1  (* NEWLINE       LINE_DISCRIPTOR for line to be formatted.               *)
00000000  1  (* REFLINE       LINE_DISCRIPTOR for line befor or after NEWLINE.        *)
00000000  1  (* REQ_POSITION Requested position to be a basis for aligned NEWLINE.   *)
00000000  1  (***************************************************************************)
00000000  1  (* OUTPUTS:                                                              *)
00000000  1  (* NEWLINE       LINE_DISCRIPTOR with starting position aligned.         *)
00000000  1  (* ERROR         Display system error code.                              *)
00000000  1  (***************************************************************************)
00000000  1  PROCEDURE ALIGN(VAR NEWLINE,REFLINE: LINE_DISCRIPTOR; REQ_POSITION:INT; VAR ERROR:INT);
00000000  2  LABEL 1;
00001324  2  BEGIN
00001324  2  REFLINE.ENDING:=REQ_POSITION;
0000132E  2  FMTLINE(NEWLINE,REFLINE,FWD,ERROR);
0000134E  2  IF ERROR=EOF THEN
0000135C  2    BEGIN (*EOF ERROR*)
0000135C  2    ERROR:=0;
00001362  2    EOF_CLEAR_LINE(NEWLINE,FWD);  (*clear the TEXT and set START and STOP to eof values*)
00001372  2    END;  (*EOF ERROR*)
00001372  2  IF ERROR<>0 THEN GOTO 1;
00001380  2  REFLINE.STARTING:=NEWLINE.ENDING;
0000138E  2  FMTLINE(NEWLINE,REFLINE,BKWD,ERROR);
000013B0  2  IF ERROR=EOF THEN
```

```
00001 3BE  2    BEGIN (*EOF ERROR*)
00001 3BE  2    ERROR:=0;
00001 3C4  2    EOF_CLEAR_LINE(NEWLINE,FND);  (*clear the TEXT and set START and STOP to eof values*)
00001 3D4  2    END;  (*EOF ERROR*)
00001 3D4  2  1:END;
00000000  1  $PAGE$
00000000  1  $GLOBPROC OFF$
00000000  1  (*************************************************************************)
00000000  1  (*********** ABS *********************************************************)
00000000  1  (*************************************************************************)
00000000  1  (* Convert trigger relative position to absolute positon.                *)
00000000  1  (* As long as we only admit to start on measurements,ENVIRONMNET.TRIG_  *)
00000000  1  (* POSITION is 0 and this is a do nothing procedure.                     *)
00000000  1  (*************************************************************************)
00000000  1  (* INPUTS:                                                               *)
00000000  1  (* ENVIRONMENT.TRIG_POSITION  Absolute position of trigger.              *)
00000000  1  (* REL_POSITION               Position relative to trigger postion.     *)
00000000  1  (*************************************************************************)
00000000  1  (* OUTPUTS                                                               *)
00000000  1  (* ABS                        Absolute position.                        *)
00000000  1  (*************************************************************************)
00000000  1  FUNCTION ABSOLUT(REL_POSITION:INT):INT;
00000002  2  VAR TEMP:INT;
00001 3DC  2  BEGIN
00001 3DC  2  TEMP:=REL_POSITION+ENVIRONMENT^.TRIG_POSITION;  (*Convert relative position to absolute position*)
00001 3EC  2  IF TEMP<0 THEN ABSOLUT:=0 ELSE ABSOLUT:=TEMP;
00001400  2  END;
00000000  1  $PAGE$
00000000  1  $GLOBPROC OFF$
00000000  1  (*************************************************************************)
00000000  1  (*********** COPYY *******************************************************)
00000000  1  (*************************************************************************)
00000000  1  (* Output tracelist to listing file. Output consists of entire current *)
00000000  1  (* display plus all information between current display and requested  *)
00000000  1  (* position. Each line of output is prefixed with its starting position*)
00000000  1  (* Positions are 6 characters: a sign, 4 digits and a blank.            *)
00000000  1  (* If the requested position is before the start of the display,       *)
00000000  1  (* then the position is aligned before outputing.                      *)
00000000  1  (* The dislay is left unchanged.                                        *)
00000000  1  (* Output lines are a maximum of 236. This is checked by the monitor    *)
00000000  1  (* before being accepted. The monitor allows 220 + up to 10 spaces      *)
00000000  1  (* between fields + the 6 position characters.                         *)
00000000  1  (*************************************************************************)
00000000  1  (* INPUTS:                                                               *)
00000000  1  (* ABS_POSITION          Requested absolute start or stop position.    *)
00000000  1  (* MONITOR^.LISTFILE_NAME Name of list file.                            *)
00000000  1  (* MONITOR^.LISTFILE_DISC Disc# for list file.                          *)
00000000  1  (* MONITOR^.APPEND        1==> append, 0==> don't append.               *)
00000000  1  (* MONITOR^.CMD           COPYALL==> copy entire tracelist.             *)
00000000  1  (*                        COPY   ==> copy POSITION thru crrnt display.  *)
00000000  1  (*************************************************************************)
00000000  1  (* OUTPUTS:                                                              *)
00000000  1  (* ERROR         Display system error code.                              *)
00000000  1  (*************************************************************************)
00000000  1  PROCEDURE COPYY(VAR ERROR:INT);
00000000  2  LABEL 1;
00000000  2  CONST
00000000  2  FORMFEED        =0C20H;
00000000  2  BLANK           =2020H;
00000000  2  MAXLINECOUNT    =54;              (* # Data lines/page, excluding header lines*)
00000000  2
00000000  2  VAR
00000000  2  LISTFILE_ERROR :INT;              (*0==> No error in listfile, not 0==> listfile error.  *)
00000002  2  DESTSIZE       :INT;              (*Dest size for formating position*)
00000004  2  NEWLINE        :^LINE_DISCRIPTOR; (*Ptr to line to be formated by FMTLINE*)
00000008  2  REFLINE        :^LINE_DISCRIPTOR; (*ptr to reference line used to format NEWLINE*)
0000000C  2  TEMP           :^LINE_DISCRIPTOR; (*temporary for exchanging NEWLINE with REFLINE*)
00000010  2  IBUFF          :FMCRBUFF_PTR;     (*ptr to reference line used to format NEWLINE*)
00000014  2  PAGECOUNT      :INT;              (*# of pages formatted so far*)
00000016  2  LINECOUNT      :INT;              (*# of lines on current page of output*)
00000018  2  BOTTOM         :INT;              (*Physical line # of logical bottom of display*)
0000001A  2  START          :INT;              (*Starting position*)
0000001C  2  STOP           :INT;              (*stopping position*)
0000001E  2  ABS_LOCATION   :INT;              (*Absolute location in footdc data*)
```

```
00000020 2 DCB           :DCB_PTR;
00000024 2 WORDCOUNT     :INT;          (*Number of 16 bit words to output to list file*)
00000026 2 FIRST_KC9A    :BOOLEAN;      (*Use to ALIGN first call to get KC9A count correct,if not at beg of footdc*)
00000027 2 $PAGE$
00000000 2 #IF M68000
00000000 2 (********** OUTPUT_LINE ***************************************************)
00000000 2 PROCEDURE OUTPUT_LINE(WORDCOUNT:INT; IBUFF:FMGRBUFF_PTR; VAR LISTFILE_ERROR:INT);
00000000 3 CONST
00000000 3 ON_INVERSE    =CHAR(090H);
00000000 3 ON_UNDERSCORE =CHAR(0A0H);
00000000 3 OFF_INVERSE   =CHAR(080H);
00000000 3 VAR
00000000 3 TEMP1      :FMGRBUFF_PTR;
00000004 3 TEMP2      :FMGRBUFF_PTR;
00000008 3 K          :INT;
0000000A 3 C1         :CHAR;
0000000B 3 C2         :CHAR;
0000000C 3 ENHANCED   :BOOLEAN;  (*True if current character in enhanced field*)
0000000D 3 DOUBLE     :BOOLEAN;  (*True if TEMP 2 needs to be outputed*)
0000140E 3 BEGIN
0000140E 3 NEW(TEMP1);
00001420 3 NEW(TEMP2);
00001432 3 DOUBLE:=FALSE;
00001436 3 ENHANCED:=FALSE;
0000143A 3 TEMP1^[0]:=WORDCOUNT;
00001442 3 TEMP2^[0]:=WORDCOUNT;
0000144A 3 FOR K:=0 TO (WORDCOUNT*2)-1 DO
00001464 3   BEGIN
00001464 3   GETCHAR(PTR(IBUFF),K,C1);
0000147C 3   PUTCHAR(PTR(IBUFF),K," ");
00001490 3   CASE C1 OF
0000149A 3     ON_UNDERSCORE,
0000149A 3     ON_INVERSE  :BEGIN
0000149A 3                  DOUBLE:=TRUE;
000014A0 3                  ENHANCED:=TRUE;
000014A6 3                  C1:=" ";
000014AC 3                  C2:=" ";
000014B2 3                  END;
000014B6 3     OFF_INVERSE :BEGIN
000014B6 3                  ENHANCED:=FALSE;
000014BA 3                  C1:=" ";
000014C0 3                  C2:=" ";
000014C6 3                  END;
000014CA 3     OTHERWISE   IF ENHANCED
000014D2 3                    THEN C2:="-"
000014DC 3                    ELSE C2:=" ";
000014E2 3     END; (*END CASE*)
000014FA 3   PUTCHAR(PTR(TEMP1),K+2,C1);
00001512 3   PUTCHAR(PTR(TEMP2),K+2,C2);
0000152A 3   END;
0000153E 3 P_WRITE (DCB^, TEMP1^[0], LISTFILE_ERROR);
00001560 3 IF DOUBLE THEN P_WRITE (DCB^, TEMP2^[0], LISTFILE_ERROR);
0000158A 3 DISPOSE(TEMP1);
0000159C 3 DISPOSE(TEMP2);
000015AE 3 IF LISTFILE_ERROR<>0 THEN  P_FILE_ERR(DCB^,LISTFILE_ERROR); (*Write error message to be cleared on next keystroke*)
000015D0 3 END;
00000000 2 (********** PREPARE_FILE ***************************************************)
00000000 2 PROCEDURE PREPARE_FILE(VAR LISTFILE_ERROR:INT);
00000000 3 LABEL 1;
00000000 3 CONST
00000000 3 DCBSIZE        =2;           (*Two sector dcb*)
00000000 3 EOF            =1;
00000000 3 FILE_EXIST     =4;           (*Fmgr error*)
00000000 3 FILE_NOT_FOUND =3;           (*Fmgr error*)
00000000 3 VAR
00000000 3 $EXTVAR ON$
00000000 3 printer_HP   :FMGRNAME;
00000000 3 $EXTVAR OFF$
000015D8 3 BEGIN
000015D8 3 NEW(DCB); (*NEW a single word DCB for list file*)
000015EE 3 P_OPEN(MONITOR^.LISTFILE_NAME,5,MONITOR^.LISTFILE_DISC,DCB^,DCBSIZE,LISTFILE_ERROR);
0000161E 3 IF LISTFILE_ERROR=FILE_NOT_FOUND  THEN
0000162C 3   IF MONITOR^.LISTFILE_NAME <> printer_HP THEN
0000164A 3     P_CREATE(MONITOR^.LISTFILE_NAME,5,MONITOR^.LISTFILE_DISC,DCB^,DCBSIZE,LISTFILE_ERROR);
```

```
00001676  3  IF LISTFILE_ERROR<>0 THEN GOTO 1;
00001684  3  IF MONITOR^.APPEND THEN
00001690  3    BEGIN
00001690  3    P_POSITION (DCB^, 9999, LISTFILE_ERROR);
000016B0  3    IF LISTFILE_ERROR = EOF THEN LISTFILE_ERROR:=0; (*I want an eof*)
000016C4  3    IF LISTFILE_ERROR<>0 THEN GOTO 1;
000016D2  3    END;
000016D2  3  P_CALENDAR(PTR(ADDR(IBUFF^[2])));
000016E8  3  IBUFF^[1]:=BLANK;
000016F6  3  IBUFF^[0]:=13;
00001702  3  P_WRITE (DCB^, IBUFF^[0], LISTFILE_ERROR);
00001724  3  1: IF LISTFILE_ERROR<>0 THEN P_FILE_ERR(DCB^,LISTFILE_ERROR);
00001746  3  END;
00000000  2  $PAGE$
00000000  2  (********** DUMP_HEADER ***************************************************)
00000000  2  PROCEDURE DUMP_HEADER(VAR LISTFILE_ERROR:INT);
0000174E  3  BEGIN
0000174E  3  BPC_READ(PTR(ADDR(IBUFF^[0])),0FA18H,80);
00001768  3  OUTPUT_LINE(40,IBUFF,LISTFILE_ERROR);   (*Analyzer name and slot #*)
0000178A  3  IBUFF^[0]:=BLANK;
00001796  3  OUTPUT_LINE(1,IBUFF,LISTFILE_ERROR);                       (*Ouptut blank line*)
000017B8  3  IF LISTFILE_ERROR<>0 THEN P_FILE_ERR(DCB^,LISTFILE_ERROR);
000017DA  3  END;
00000000  2
00000000  2  (********** FINISH_FILE ***************************************************)
00000000  2  PROCEDURE FINISH_FILE(VAR LISTFILE_ERROR:INT);
00000000  3  VAR
00000000  3  CLOSE_ERROR:INT; (*Local error for close only*)
00000002  3  $EXTVAR ON$
00000002  3  S006       :STRNG;    (*"Copy complete "*)
00000002  3  $EXTVAR OFF$
000017E2  3  BEGIN
000017E2  3  P_CLOSE (DCB^,CLOSE_ERROR);  (*Ignore close error*)
000017F8  3  DISPOSE(DCB);
0000180E  3  IF (LISTFILE_ERROR=0) AND (CLOSE_ERROR=0)
0000182A  3    THEN STATUS_LINE(STRNG_PTR(ADDR(S006)),4000H,BIGBUFF^[CENTER].STARTING); (*"Copy complete "*)
00001854  3  END;
00000000  2  #ENDIF
00000000  2
00000000  2  (********** TOP OF FORM PROCEDURE ****************************************)
00000000  2  PROCEDURE TOF(WORDCOUNT:INT;VAR LISTFILE_ERROR:INT);  (*TOP OF FORM AND HEADER INFORMATION*)
00000000  3  LABEL 1;
0000185C  3  BEGIN
0000185C  3  IBUFF^[0]:=FORMFEED;
00001868  3  IF PAGECOUNT<>0 THEN OUTPUT_LINE(1,IBUFF,LISTFILE_ERROR); (*Form feed*)
00001892  3  DUMP_HEADER(LISTFILE_ERROR);    (*Analyzer name and slot # then underline line then blank line*)
000018A4  3  IBUFF^[0]:=BLANK;
000018B0  3  IBUFF^[1]:=BLANK;
000018BE  3  IBUFF^[2]:=BLANK;                                (*Clear stuff from analyzer name and date*)
000018CC  3  MOVEBYTES(PTR(ADDR(HEADINGS^.ASCII)),0,  PTR(IBUFF),6,HEADINGS^.LEN);  (*Move column headings*)
000018F6  3  PUTCHAR(PTR(IBUFF),5,CHAR(0A0H));               (*Put on underscore at start of headings*)
0000190E  3  OUTPUT_LINE(WORDCOUNT,IBUFF,LISTFILE_ERROR);                  (*Output column headings*)
00001930  3  PUTCHAR(PTR(IBUFF),5,CHAR(020H));               (*Put space at start of headings*)
00001948  3  LINECOUNT:=0;
00001950  3  PAGECOUNT:=PAGECOUNT+1;
00001954  3  1:END;
00000000  2  $PAGE$
0000195C  2  (**************************************************************************)
0000195C  2  (********** COPYY *********************************************************)
0000195C  2  (**************************************************************************)
0000195C  2  BEGIN WITH MONITOR^ DO BEGIN
00001962  2  NEW(NEWLINE);
00001974  2  NEW(REFLINE);
00001986  2  NEW(IBUFF);
00001998  2  REFLINE^.KC9A[0]:=0;
000019A2  2  REFLINE^.KC9A[1]:=0;
000019AE  2  REFLINE^.KC9A[2]:=0;
000019BA  2  REFLINE^.KC9A[3]:=0;
000019C6  2  BOTTOM:=(TOP+MAXLINE) MOD DATALINES;
000019E0  2  WITH HEADINGS^ DO  (*Use WITH to avoid LR error on BPC compile/assemly*)
000019E6  2    WORDCOUNT:=(LEN+7) DIV 2; (*Add 6 bytes for position, 1 for possible odd byte then convert to words*)
000019F8  2  CASE MONITOR^.CMD OF
00001A06  2  COPYALL   :BEGIN  (*COPYALL*)
00001A06  2            START:=0;
```

```
00001A0A  2            STOP := 9999;
00001A10  2            END;  (*COPYALL*)
00001A14  2  COPY     :BEGIN  (*COPY*)
00001A14  2            START:=BIGBUFF^[TOP].STARTING;   (*Initialize START:= top of display*)
00001A2A  2            STOP :=BIGBUFF^[BOTTOM].ENDING;  (*Initialize STOP := Bottom of display*)
00001A3C  2            ABS_LOCATION:=ABSOLUT(MONITOR^.LOCATION); (*Convert reletive location to absolute location*)
00001A50  2            IF ABS_LOCATION<BIGBUFF^[TOP].STARTING THEN
00001A6C  2              BEGIN (*Requested position is before top of display*)
00001A6C  2              ALIGN(NEWLINE^,REFLINE^,ABS_LOCATION,ERROR);
00001A8C  2              IF ERROR<>0 THEN GOTO 1;
00001A9A  2              START:=NEWLINE^.STARTING;                         (*START:= aligned requested position*)
00001AA4  2              END;  (*Requested position is before top of display*)
00001AA4  2            IF ABS_LOCATION>=BIGBUFF^[BOTTOM].ENDING THEN
00001AC0  2              BEGIN (*Requested position is after bottom of display*)
00001AC0  2              ALIGN(NEWLINE^,REFLINE^,ABS_LOCATION,ERROR);
00001AE0  2              IF ERROR<>0 THEN GOTO 1;
00001AEE  2              STOP :=NEWLINE^.ENDING;                       (*STOP := aligned requested POSITION*)
00001AF8  2              END;  (*Requested position is after bottom of display*)
00001AF8  2            END;  (*COPY*)
00001AFC  2  OTHERWISE ;
00001AFC  2  END; (*END CASE*)
00001B22  2  $PAGE$
00001B22  2  (********** Output lines *************************************************)
00001B22  2  #IF M68000
00001B22  2  STATUS_LINE(STRNG_PTR(ADDR(S005)),0400H,START); (*Stack/NOT DISPLAY new message  (clobber stacked emulation status*)
00001B3A  2  #ELSE
00001B3A  2  STATUS_LINE(STRNG_PTR(ADDR(S005)),0000H,START); (*Stack on new message  (clobber stacked emulation status) *)
00001B3A  2  #ENDIF
00001B3A  2  PREPARE_FILE(LISTFILE_ERROR);
00001B4A  2  IF LISTFILE_ERROR<>0 THEN GOTO 1;
00001B56  2  PAGECOUNT:=0;
00001B5A  2  TOF(WORDCOUNT,LISTFILE_ERROR);
00001B72  2  IF LISTFILE_ERROR<>0 THEN GOTO 1;
00001B7E  2  IF START <> 0 THEN FIRST_KC9A := TRUE     (** KC9A **)
00001B90  2                ELSE FIRST_KC9A := FALSE;   (** KC9A **)
00001B94  2  REFLINE^.SOURCELINE_NO:=0;         (*Initialize REFLINE*)
00001B9C  2  REFLINE^.ENDING:=START;
00001BA6  2  WHILE REFLINE^.ENDING < STOP DO    (** COPY TO ending position **)
00001BB6  2    BEGIN (*Format lines *)
00001BB6  2    IF LINECOUNT=MAXLINECOUNT THEN  TOF(WORDCOUNT,LISTFILE_ERROR); (* If page is full, do a top of form*)
00001BDA  2    IF LISTFILE_ERROR<>0 THEN GOTO 1;
00001BE6  2    IF FIRST_KC9A THEN BEGIN          (** ALIGN to get proper 1st KC9A **)
00001BEE  2     FIRST_KC9A := FALSE;              (** KC9A **)
00001BF2  2     ALIGN(NEWLINE^,REFLINE^,START,ERROR);(** KC9A **)
00001C14  2     IF ERROR<>0 THEN GOTO 1;           (** KC9A **)
00001C22  2     END ELSE                           (** KC9A **)
00001C26  2    FMTLINE(NEWLINE^,REFLINE^,FWD,ERROR);
00001C46  2    IF ERROR<>0 THEN
00001C50  2      BEGIN (*EOF ERROR*)
00001C50  2      IF ERROR=EOF THEN ERROR:=0;
00001C64  2      GOTO 1;
00001C68  2      END;  (*EOF ERROR*)
00001C68  2    MOVEBYTES(PTR(ADDR(NEWLINE^.TEXT.ASCII)),0,  PTR(IBUFF),6,NEWLINE^.TEXT.LEN);
00001C8C  2    DESTSIZE:=5;                    (*Dest size for formatting position*)
00001C92  2    FORMAT(SIGNED,PTR(ADDR(NEWLINE^.STARTING)),2,PTR(IBUFF),0,DESTSIZE,10,RIGHT);
00001CC2  2    OUTPUT_LINE(WORDCOUNT,IBUFF,LISTFILE_ERROR);
00001CDE  2    IF LISTFILE_ERROR<>0 THEN GOTO 1;
00001CEA  2    TEMP:=NEWLINE;
00001CF0  2    NEWLINE:=REFLINE;
00001CF6  2    REFLINE:=TEMP;
00001CFC  2    LINECOUNT:=LINECOUNT+1;
00001D00  2    END;  (*Format lines *)
00001D04  2
00001D04  2  1: (*LISTFILE_ERRORs have already been displayed on status line*)
00001D04  2  DISPOSE(NEWLINE);
00001D16  2  DISPOSE(REFLINE);
00001D28  2  DISPOSE(IBUFF);
00001D3A  2  FINISH_FILE(LISTFILE_ERROR);
00001D4A  2  END; END; (*END WITH MONITOR^*) (*END PROCEDURE COPY*)
00000000  1  $PAGE$
00000000  1  $GLOBPROC OFF$
00000000  1  (*************************************************************************)
00000000  1  (********** FORMAT DISPLAY ***********************************************)
00000000  1  (*************************************************************************)
```

```
00000000  1  (* INPUTS:                                                          *)
00000000  1  (* ABS_LOCATION  Absolute position in footdc for center of display  *)
00000000  1  (*               (2 positions/data rec).                            *)
00000000  1  (*******************************************************************)
00000000  1  (* OUTPUTS:                                                         *)
00000000  1  (* ERROR         Display system error code.                         *)
00000000  1  (*******************************************************************)
00000000  1  PROCEDURE FMT_DISPLAY(ABS_LOCATION:INT; VAR ERROR:INT);
00000000  2  LABEL 1;
00000000  2  VAR
00000000  2  K           :INT;  (*INDEX FOR MOVING BLANK CHARACTERS*)
00000002  2  LINE        :INT;  (*LOGICAL AND PYHSICAL LINE OF INTREST*)
00000004  2  CENTER      :INT;  (*LOGICAL AND PHYSICAL CENTER OF DISPLAY*)
00000006  2  REC_NO      :INT;  (*RECORD NUMBER OF EOF IF POSITION IS AFTER EOF*)
00001D52  2
00001D52  2  BEGIN
00001D52  2  (********** INITIALIZE ***************************************************)
00001D52  2  FMTHEADER(HEADINGS);        (*Format column headings*)
00001D5E  2  IF ENVIRONMENT^.MEASCODE =TRACESTATEMENTS THEN FINDMODE(MODE);
00001D7A  2  COLUMN:=0;                  (*Left justify display*)
00001D7E  2  TOP:=0;                     (*Logical top    of display = physical top    of BIGBUFF*)
00001D82  2  CENTER:=MAXLINE DIV 2;      (*Logical center of display = physical center of BIGBUFF*)
00001D88  2
00001D88  2  (********** FORMAT 15 LINES OF DISPLAY **********************************)
00001D88  2  ALIGN(BIGBUFF^[CENTER],BIGBUFF^[CENTER-1],ABS_LOCATION,ERROR); (*Align and format center line*)
00001DBC  2
00001DBC  2  FOR LINE:=CENTER+1 TO MAXLINE DO
00001DD0  2    BEGIN (*Format CENTER line +1 through MAXLINE*)
00001DD0  2    FMTLINE(BIGBUFF^[LINE], BIGBUFF^[LINE-1], FWD, ERROR);      (*FMT LINE USING PRIMITIVE JUST FOUND*)
00001E02  2    IF ERROR=EOF THEN
00001E10  2      BEGIN
00001E10  2      EOF_CLEAR_LINE(BIGBUFF^[LINE],FWD);  (*clear the TEXT and set START and STOP to eof values*)
00001E2A  2      ERROR:=0;
00001E30  2      END;
00001E30  2    IF ERROR<>0 THEN GOTO 1;
00001E3E  2    END;  (*Format CENTER line +1 through MAXLINE*)
00001E4E  2
00001E4E  2  FOR LINE:=CENTER-1 DOWNTO 0 DO
00001E60  2    BEGIN (*Format CENTER line -1 through 0*)
00001E60  2    FMTLINE(BIGBUFF^[LINE], BIGBUFF^[LINE+1], BKWD, ERROR); (*FMT LINE USING PRIMITIVE JUST FOUND*)
00001E94  2    IF ERROR=EOF THEN
00001EA2  2      BEGIN
00001EA2  2      EOF_CLEAR_LINE(BIGBUFF^[LINE],BKWD);  (*clear the TEXT and set START and STOP to eof values*)
00001EBE  2      ERROR:=0;
00001EC4  2      END;
00001EC4  2    IF ERROR<>0 THEN GOTO 1;
00001ED2  2    END;  (*Format CENTER line -1 through 0*)
00001EE4  2  1:END;
00000000  1  $PAGE$
00000000  1  $GLOBPROC ON$
00000000  1  (*******************************************************************)
00000000  1  (********** CONCLUDE ***********************************************)
00000000  1  (*******************************************************************)
00000000  1  (* OUTPUTS:                                                         *)
00000000  1  (* ERROR         Display system error code.                         *)
00000000  1  (*******************************************************************)
00000000  1  PROCEDURE CONCLUDE;
00000000  2  VAR ERROR:INT;
00001EEC  2  BEGIN
00001EEC  2  #IF NOT M68000
00001EEC  2  P_CLOSE(ENVIRONMENT^.DCB^,ERROR);
00001EEC  2  #ELSE
00001EEC  2  RELEASE(HEAP);
00001EF8  2  #ENDIF
00001EF8  2  END;
00000000  1  $PAGE$
00000000  1  $GLOBPROC OFF$
00000000  1  (*******************************************************************)
00000000  1  (********** ROLL UP ************************************************)
00000000  1  (*******************************************************************)
00000000  1  (* OUTPUTS:                                                         *)
00000000  1  (* ERROR         Display system error code.                         *)
00000000  1  (*******************************************************************)
00000000  1  PROCEDURE UP(VAR ERROR:INT);
```

```
00000000  2  LABEL 1;
00000000  2  VAR
00000000  2  K        :INT; (*INDEX FOR MOVING BLANK CHARACTERS*)
00000002  2  TEST     :INT; (*PHYSICAL BIGBUFF LINE NUMBER OF LOGICAL CENTER OF DISPLAY+1*)
00000004  2  REC_NO   :INT; (*RECORD NUMBER OF EOF IF POSITION IS AFTER EOF*)
00000006  2  ERR      :INT; (*ERROR FLAG FOR "GET_REC_NUM"*)
00000008  2  REFLINE :INT;
00001F00  2  BEGIN
00001F00  2  IF TOP=0 THEN REFLINE:=MAXLINE ELSE REFLINE:=TOP-1;
00001F1C  2  FMTLINE(BIGBUFF^[TOP], BIGBUFF^[REFLINE], FWD, ERROR); (*FORMAT THE LINE USING PRIMITIVE JUST FOUND*)
00001F4C  2  IF ERROR=EOF THEN
00001F5A  2    BEGIN (*EOF ERROR*)
00001F5A  2    TEST:=((TOP+MAXLINE DIV 2)+1) MOD DATALINES; (*Should I roll a blank line or do nothing*)
00001F74  2    IF BIGBUFF^[TEST].STARTING<>ENVIRONMENT^.LAST_POSITION THEN
00001F90  2      BEGIN  (*OK to roll a blank line*)
00001F90  2      ERROR:=0;
00001F96  2      EOF_CLEAR_LINE(BIGBUFF^[TOP],FWD);  (*clear the TEXT and set START and STOP to eof values*)
00001FB0  2      END;   (*OK to roll a blank line*)
00001FB0  2    END;  (*EOF ERROR*)
00001FB0  2  IF ERROR=0 THEN TOP:=(TOP+1) MOD DATALINES;
00001FD2  2  1:END;
00000000  1  $PAGE$
00000000  1  $GLOBPROC OFF$
00000000  1  (*****************************************************************************)
00000000  1  (********** ROLL DOWN *********************************************************)
00000000  1  (*****************************************************************************)
00000000  1  (* OUTPUTS:                                                                  *)
00000000  1  (* ERROR          Display system error code.                                 *)
00000000  1  (*****************************************************************************)
00000000  1  PROCEDURE DOWN(VAR ERROR:INT);
00000000  2  VAR
00000000  2  K        :INT; (*INDEX FOR MOVING BLANK CHARACTERS*)
00000002  2  TEST     :INT; (*PHYSICAL BIGBUFF LINE NUMBER OF LOGICAL CENTER OF DISPLAY-1*)
00000004  2  NEWLINE :INT; (*PHYSICAL BIGBUFF LINE NUMBER OF LOGICAL LINE BEFORE TOP*)
00000006  2  REFLINE :INT;
00001FDA  2  BEGIN
00001FDA  2  IF TOP=0 THEN NEWLINE:=MAXLINE ELSE NEWLINE:=TOP-1;
00001FF6  2  REFLINE:=TOP;
00001FFC  2  FMTLINE(BIGBUFF^[NEWLINE], BIGBUFF^[REFLINE], BKWD, ERROR); (*FORMAT THE LINE USING PRIMITIVE JUST FOUND*)
0000202E  2  IF ERROR=EOF THEN
0000203C  2    BEGIN (*EOF ERROR*)
0000203C  2    TEST:=((TOP+MAXLINE DIV 2)-1) MOD DATALINES; (*Should I roll a blank line or do nothing*)
00002056  2    IF BIGBUFF^[TEST].ENDING<>0  THEN
0000206A  2      BEGIN  (*OK to roll a blank line*)
0000206A  2      ERROR:=0;
00002070  2      EOF_CLEAR_LINE(BIGBUFF^[NEWLINE],BKWD);  (*clear the TEXT and set START and STOP to eof values*)
0000208C  2      END;   (*OK to roll a blank line*)
0000208C  2    END;  (*EOF ERROR*)
0000208C  2  IF ERROR=0 THEN TOP:=NEWLINE;
0000209C  2  END;
00000000  1  $PAGE$
00000000  1  $GLOBPROC ON$
00000000  1  (*****************************************************************************)
00000000  1  (********** INITIALIZE ********************************************************)
00000000  1  (*****************************************************************************)
00000000  1  (* Do measurement dependent initialization first.                           *)
00000000  1  (* BPC and 68000 calls are different because BPC uses jump table to         *)
00000000  1  (* handle overlays.                                                          *)
00000000  1  (*****************************************************************************)
00000000  1  (* OUTPUTS                                                                   *)
00000000  1  (* ERROR        0==> No error or non fatal error.                            *)
00000000  1  (*              Not 0 ==> There is a fatal error, we can not procede         *)
00000000  1  (*              any further with display software.  Error message is        *)
00000000  1  (*              on status line.                                              *)
00000000  1  (*****************************************************************************)
00000000  1  PROCEDURE INIT(VAR ERROR:INT);
00000000  2  LABEL 1;
00000000  2  VAR
00000000  2  J            :INT;                  (*row index for initializing BIGBUFF.TEX*)
00000002  2  K            :INT;                  (*col index for initializing BIGBUFF.TEX*)
000020A4  2
000020A4  2  BEGIN
000020A4  2  ZERO[0]:=0;
000020A8  2  ZERO[1]:=0;
```

```
000020AC  2  ONE[0] :=0;
000020B0  2  ONE[1] :=1;
000020B6  2  FIRST_CALL:=TRUE; (*TRUE ==> I WILL DISPLAY TOM/KIPPER'S STATUS LINE*)
000020BC  2  #IF M68000
000020BC  2  MARK(HEAP);              (*INTIALIZE MEMORY*)
000020C8  2  #ENDIF
000020C8  2  NEW(BIGBUFF);            (*NEW SPACE FOR BIGBUFF*)
000020DA  2  NEW(HEADINGS);           (*NEW SPACE FOR HEADINGS*)
000020EC  2  NEW(PRIMITIVE);          (*NEW SPACE FOR PRIMITIVE*)
000020FE  2  NEW(HOLD_PRIMITIVE);     (*NEW SPACE FOR HOLD_PRIMITIVE*)
00002110  2  NEW(ENVIRONMENT);        (*NEW SPACE FOR ENVIRONMENT*)
00002122  2  INIT_SCREEN;             (*NEW A 16*80 SCREEN IMAGE IFF 68000*)
00002128  2  INIT_GETFILE;            (*INITIALIZE GETFILE FOR GETTING SOURCE LINES*)
0000212E  2  INIT_ENVIRONMENT(ERROR); (*READ HEADER RECORDS FROM FOOTDC*)
0000213C  2  IF ERROR<>0 THEN GOTO 1; (*Error message has already been displayed on status line.*)
0000214A  2
0000214A  2  HOLD:=FALSE;             (*NOTHING IN HOLD_PRIMITIVE*)
0000214E  2  TOP:=0;                  (*THE FIRST LINE OF THE DISPLAY IS BIGBUFF[0] *)
00002152  2  COLUMN:=0;               (*MY 80 COLUMN WINDOW IS INITIALIZED TO FIRST COLUMN OF 240 COLUMN DISPLAY*)
00002156  2  #IF M68000
00002156  2  (********** 68000 MEASURMENT DEPENDENT INTIALIZATIONS *************************)
00002156  2  CASE ENVIRONMENT^.MEASCODE OF
00002164  2    TRACEVARIABLES,
00002164  2    DISPLAYVARIABLE,
00002164  2    MODIFYVARIABLE  :INIT_TRACEVAR;
0000216E  2    TRACESTATEMENTS :INIT_TRACESTM(ERROR);  (*INTIALIZE PROC_ARRAY AND LINKED LIST OF DATA BASE INFO*)
00002180  2    TRACEMODULES    :INIT_TRACEMOD;
0000218A  2    TRACEDATA_FLOW  :INIT_TRACEDATA;
00002194  2    TRACEDONTCARE,
00002194  2    DISPLAYBREAK    :INIT_TRACEDONT;
0000219E  2    TIMEMODULES     :INIT_TIMEMOD;
000021A0  2    COUNTSTATEMENTS :INIT_COUNTSTM(ERROR);
000021BA  2    OTHERWISE;
000021BA  2    END; (*CASE*)
000021F2  2  #ELSE
000021F2  2  (********** BPC MEASURMENT DEPENDENT INTIALIZATIONS *************************)
000021F2  2  CASE ENVIRONMENT^.MEASCODE OF
000021F2  2    TRACEVARIABLES,
000021F2  2    DISPLAYVARIABLE,
000021F2  2    MODIFYVARIABLE  :J_INIT_TRACEVAR;
000021F2  2    TRACESTATEMENTS :J_INIT_TRACESTM(ERROR);  (*INTIALIZE PROC_ARRAY AND LINKED LIST OF DATA BASE INFO*)
000021F2  2    TRACEMODULES    :J_INIT_TRACEMOD;
000021F2  2    TRACEDATA_FLOW  :J_INIT_TRACEDATA;
000021F2  2    OTHERWISE;
000021F2  2    END; (*CASE*)
000021F2  2  #ENDIF
000021F2  2  IF ERROR<>0 THEN GOTO 1; (*Error message has already been displayed on status line.*)
00002200  2  ENVIRONMENT^.TRIG_POSITION:=0;        (*THIS WILL TAKE ADDITIONAL WORK WHEN WE ADMIT TO CENTER/END ON MEASURMENTS*
00002208  2  TRIG_KC9A[0] :=0;                     (*INITIALIZE TRIGGER  STATE/TIME COUNT ASSUMING START ON TRACE*)
0000220C  2  TRIG_KC9A[1] :=0;                     (*INITIALIZE TRIGGER  STATE/TIME COUNT ASSUMING START ON TRACE*)
00002210  2  TRIG_KC9A[2] :=0;                     (*INITIALIZE TRIGGER  STATE/TIME COUNT ASSUMING START ON TRACE*)
00002214  2  TRIG_KC9A[3] :=0;                     (*INITIALIZE TRIGGER  STATE/TIME COUNT ASSUMING START ON TRACE*)
00002218  2  1:END;
00000000  1  $PAGE$
00000000  1  $GLOBPROC ON$
00000000  1  (**************************************************************************)
00000000  1  (********** MAIN PROGRAM  *************************************************)
00000000  1  (**************************************************************************)
00000000  1  (* INPUTS:                                                               *)
00000000  1  (* MON         PTR TO MONITOR/DISPLAY CONTROL STRUCTURE                  *)
00000000  1  (* ERROR       Must be 0.                                                *)
00000000  1  (**************************************************************************)
00000000  1  (* OUTPUTS                                                               *)
00000000  1  (* ERROR       0==> No error or non fatal error.                         *)
00000000  1  (*             Not 0 ==> fatal error, dont call main again without       *)
00000000  1  (*                       first calling INIT.                             *)
00000000  1  (**************************************************************************)
00000000  1  PROCEDURE MAIN(MON:DISPLAY_SPEC_PTR; VAR ERROR:INT);
00000000  2  VAR
00000000  2  I                :INT;
00000002  2  DESTSIZE         :INT;             (*DESTINATION SIZE FOR FORMATTING POSITION ON STATUS LINE*)
00002220  2
00002220  2  BEGIN  (*PROCEDURE MAIN (THERE IS NO MAIN PROGRAM AS SUCH)*)
00002220  2  MONITOR:=MON;  (*SAVE IN A STATIC VARIABLE TO MAKE IT GLOBAL THROUGHOUT MAIN *)
```

```
00002226  2  CASE MONITOR^.CMD OF
00002234  2    ROLL_UP              :BEGIN
00002234  2                          STATUS_MESSAGE:=STRNG_PTR(ADDR(S005));   (*"Awaiting command"*)
0000223E  2                          UP(ERROR);
0000224C  2                          END;
00002250  2    ROLL_DOWN            :BEGIN
00002250  2                          STATUS_MESSAGE:=STRNG_PTR(ADDR(S005));   (*"Awaiting command"*)
0000225A  2                          DOWN(ERROR);
00002268  2                          END;
0000226C  2    NEXT_PAGE            :BEGIN
0000226C  2                          STATUS_MESSAGE:=STRNG_PTR(ADDR(S003));   (*"Formatting next page"*)
00002276  2                          FOR I:=1 TO DATALINES DO IF ERROR=0 THEN   UP(ERROR);
000022A4  2                          END;
000022A8  2    PREVIOUS_PAGE        :BEGIN
000022A8  2                          STATUS_MESSAGE:=STRNG_PTR(ADDR(S004));  (*"Formatting previous page"*)
000022B2  2                          FOR I:=1 TO DATALINES DO IF ERROR=0 THEN DOWN(ERROR);
000022E0  2                          END;
000022E4  2    REFORMAT             :BEGIN
000022E4  2                          STATUS_MESSAGE:=STRNG_PTR(ADDR(S001)); (*"Formatting display"*)
000022EE  2                          FMT_DISPLAY(BIGBUFF^[CENTER].STARTING,ERROR);
00002312  2                          END;
00002316  2    POSITION (*!*)       :BEGIN  (*This is the first call from monitor after initalization*)
00002316  2                          STATUS_MESSAGE:=STRNG_PTR(ADDR(S001)); (*"Formatting display"*)
00002320  2                          FMT_DISPLAY(ABSOLUT(MONITOR^.LOCATION),ERROR); (*Format display centered on MONITOR^.POSITI
00002340  2                          END;
00002344  2    COPY, COPYALL        :BEGIN
00002344  2                          STATUS_MESSAGE:=STRNG_PTR(ADDR(S002)); (*"Copying"*)
0000234E  2                          COPYY(ERROR);
0000235C  2                          END;
00002360  2    SHIFT_LEFT_ARROW     :IF COLUMN<HEADINGS^.LEN-79 THEN COLUMN:=COLUMN+1; (*SHIFT ONLY WHILE FIELDS ARE DEFINED*)
0000237C  2    SHIFT_RIGHT_ARROW    :IF COLUMN>0   THEN COLUMN:=COLUMN-1;
0000238C  2    LEFT_JUSTIFY         :COLUMN:=0;
00002394  2    NO_OP                :;
00002398  2    OTHERWISE ;
00002398  2    END; (*CASE*)
000023F6  2
000023F6  2  MONITOR^.LOCATION:=BIGBUFF^[CENTER].STARTING; (*Put new location back in MONITOR communication structure*)
0000241C  2  (*Check for footdc fngr error. Eof is not fatal, it just means I have done nothing*)
0000241C  2  (*All data base errors have already been handled and ERROR cleared if they were not fatal*)
0000241C  2  IF ERROR=EOF THEN ERROR:=0;   (*If EOF then I have done nothing and it is not an error*)
00002430  2  IF (ERROR>0) AND (ERROR<8) THEN P_FILE_ERR(ENVIRONMENT^.DCB^,ERROR);
0000246A  2  IF (ERROR=0) AND (MONITOR^.CMD<>COPY) AND (MONITOR^.CMD<>COPYALL) THEN
0000249E  2    BEGIN (*Write a new screen*)
0000249E  2    IF FIRST_CALL
000024A6  2  #IF M68000
000024A6  2      THEN BEGIN
000024A6  2      STATUS_LINE(STRNG_PTR(ADDR(S000)),2001H,-1); (*Pop the stack with a non-message*)
000024BE  2      SLEEP_(INTEGER(2),0);                        (*Else race condition *)
****WARNING ??
                    ^505
000024CE  2      STATUS_LINE(STRNG_PTR(ADDR(S005)),0400H,-1); (*Stack/NOT DISPLAY new message(clobber stckd emul status) *)
000024E6  2      END
000024EA  2  #ELSE
000024EA  2      THEN STATUS_LINE(STRNG_PTR(ADDR(S005)),2001H,-1)  (*Stack on new message  (clobber stacked emulation status) *)
000024EA  2  #ENDIF
000024EA  2      ELSE STATUS_LINE(STRNG_PTR(ADDR(S005)),2000H,BIGBUFF^[CENTER].STARTING); (*Awaiting command*)
00002514  2    WRITE_SCREEN(HEADINGS,BIGBUFF,COLUMN,TOP); (*OUTPUT A FULL SCREEN*)
00002530  2    END;  (*Write a new screen*)
00002530  2  FIRST_CALL:=FALSE;
00002534  2  END;.  (*PROCEDURE MAIN (THERE IS NO MAIN PROGRAM AS SUCH)*)

505: Warning: type change changes physical size
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.

End of compilation, number of errors=    0

00000000  1  "68000"
00000000  1  (****************************************************************************************)
00000000  1  (**********  PROCESSOR DEPENDENCIES-68000 (For bpc version see MATIFACE:SPIDIS) *******)
```

```
00000000 1 (****************************************************************************)
00000000 1 PROGRAM PD;
00000000 1 $EXTENSIONS ON$
00000000 1 $GLOBPROC+$
00000000 1 $LIB_ABS_LONG$
00000000 1
00000000 1
00000000 1 TYPE
00000000 1 POINTER =^SIGNED_32;
00000000 1 $PAGE$
00000000 1 (****************************************************************************)
00000000 1 (********** EXTEND (68000) *************************************************)
00000000 1 (****************************************************************************)
00000000 1 (* SIGN EXTEND 16 BITS INTO 32 BITS.                                        *)
00000000 1 (****************************************************************************)
00000000 1 (* INPUTS                                                                   *)
00000000 1 (* OP1          A 16 bit INT to be extended to 32 bits.                     *)
00000000 1 (****************************************************************************)
00000000 1 (* OUTPUTS                                                                  *)
00000000 1 (* RESULT       32 bit result of extending OP1.                             *)
00000000 1 (****************************************************************************)
00000000 1 PROCEDURE EXTEND(OP1:SIGNED_16; VAR RESULT:SIGNED_32);
00000004 2 BEGIN
00000004 2 RESULT:=OP1;(*EXTEND 16 BITS TO 32 BITS*)
00000010 2 END;
00000000 1
00000000 1 (****************************************************************************)
00000000 1 (********** INC_PTR (68000) ************************************************)
00000000 1 (****************************************************************************)
00000000 1 (* Incriment pointer by number specified in INC.                            *)
00000000 1 (****************************************************************************)
00000000 1 (* INPUTS                                                                   *)
00000000 1 (* P            Pointer                                                     *)
00000000 1 (* INC          Number to be added to 32 bit pointer                        *)
00000000 1 (*              68K: INC is a byte count.                                   *)
00000000 1 (*              BPC: INC is a word count.                                   *)
00000000 1 (****************************************************************************)
00000000 1 (* OUTPUTS                                                                  *)
00000000 1 (* INC_PTR      New pointer.                                                *)
00000000 1 (****************************************************************************)
00000000 1 FUNCTION INC_PTR (P:POINTER; INC:SIGNED_16):POINTER;
00000018 2 BEGIN
00000018 2 INC_PTR:=POINTER(SIGNED_32(P)+INC);
00000026 2 END;
00000000 1
00000000 1 (****************************************************************************)
00000000 1 (********** NEXTNODE (68000) ***********************************************)
00000000 1 (****************************************************************************)
00000000 1 (* INPUTS:                                                                  *)
00000000 1 (* OFFSET   16 BIT RELETIVE POINTER. THE NEXT NODE IS THE ADDRESS OF OFFSETT *)
00000000 1 (*          + THE VALUE OF OFFSET.                                          *)
00000000 1 (****************************************************************************)
00000000 1 (* OUTPUTS:                                                                 *)
00000000 1 (* NEXTNODE Pointer to the next node.  If the offset was zero, NEXTNODE is set to NIL.*)
00000000 1 (****************************************************************************)
00000000 1 FUNCTION NEXTNODE(VAR OFFSET:SIGNED_16):POINTER;
00000004 2 VAR
00000004 2 TEMP:SIGNED_32;
00000032 2 BEGIN
00000032 2 IF OFFSET=0
0000003C 2   THEN NEXTNODE:=NIL
00000044 2   ELSE
00000044 2   BEGIN
00000044 2   TEMP:=SIGNED_32(ADDR(OFFSET));
0000004C 2   NEXTNODE:=POINTER(TEMP+(OFFSET*2));
00000060 2   END;
00000060 2 END;
00000000 1 $PAGE$
00000000 1 (****************************************************************************)
00000000 1 (********** UNSIGNED_32 BIT ARITHMATIC ROUTINES *****************************)
00000000 1 (****************************************************************************)
00000000 1 PROCEDURE ADD32(OP1,OP2:UNSIGNED_32; VAR RESULT:UNSIGNED_32);
0000006C 2 BEGIN
0000006C 2 RESULT:=OP1+OP2;
```

```
0000007A  2  END;
00000000  1
00000000  1  PROCEDURE SUBTRACT32(OP1,OP2:UNSIGNED_32; VAR RESULT:UNSIGNED_32);
00000082  2  BEGIN
00000082  2  RESULT:=OP1-OP2;
00000090  2  END;
00000000  1
00000000  1  PROCEDURE MULTIPLY32(OP1,OP2:UNSIGNED_32; VAR RESULT:UNSIGNED_32);
00000098  2  BEGIN
00000098  2  RESULT:=OP1*OP2;
000000AC  2  END;
00000000  1
00000000  1  PROCEDURE DIVIDE32(OP1,OP2:UNSIGNED_32; VAR RESULT:UNSIGNED_32);
000000B4  2  BEGIN
000000B4  2  RESULT:=OP1 DIV OP2;
000000C8  2  END;
00000000  1
00000000  1
00000000  1  (***************************************************************************)
00000000  1  (********** UNSIGNED_32 BIT COMPARES ****************************************)
00000000  1  (***************************************************************************)
00000000  1  FUNCTION GE(OP1,OP2:UNSIGNED_32):BOOLEAN;
000000D0  2  BEGIN
000000D0  2  IF OP1>=OP2 THEN GE:=TRUE ELSE GE:=FALSE;
000000EA  2  END;
00000000  1
00000000  1  FUNCTION LE(OP1,OP2:UNSIGNED_32):BOOLEAN;
000000F8  2  BEGIN
000000F8  2  IF OP1<=OP2 THEN LE:=TRUE ELSE LE:=FALSE;
00000112  2  END;
00000000  1
00000000  1  FUNCTION GT(OP1,OP2:UNSIGNED_32):BOOLEAN;
00000120  2  BEGIN
00000120  2  IF OP1>OP2 THEN GT:=TRUE ELSE GT:=FALSE;
0000013A  2  END;
00000000  1
00000000  1  FUNCTION LT(OP1,OP2:UNSIGNED_32):BOOLEAN;
00000148  2  BEGIN
00000148  2  IF OP1<OP2 THEN LT:=TRUE ELSE LT:=FALSE;
00000162  2  END;
00000000  1
00000000  1  FUNCTION NE(OP1,OP2:UNSIGNED_32):BOOLEAN;
00000170  2  BEGIN
00000170  2  IF OP1<>OP2 THEN NE:=TRUE ELSE NE:=FALSE;
0000018A  2  END;
00000000  1
00000000  1  FUNCTION EQ(OP1,OP2:UNSIGNED_32):BOOLEAN;
00000198  2  BEGIN
00000198  2  IF OP1=OP2 THEN EQ:=TRUE ELSE EQ:=FALSE;
000001B2  2  END;.

End of compilation, number of errors=    0
00000000  1  "68000" PREPROCESS
00000000  1  #DEFINE M68000 TRUE
00000000  1  (****************************************************************************************)
00000000  1  (**********  KIPNIX *********************************************************************)
00000000  1  (****************************************************************************************)
00000000  1  (* SODA OPERATING SYSTEM INTEFACE TO DISPLAY SOFTWARE *************************************)
00000000  1  (****************************************************************************************)
00000000  1  PROGRAM MAINM;
00000000  1  $EXTENSIONS ON$
00000000  1  $GLOBPROC+$
00000000  1  $LIB_ABS_LONG$
00000000  1  $CALL_ABS_LONG+$
00000000  1  #INCLUDE TYPES:KIP        (*TYPE DEFINITIONS FOR DISPLAY SOFTWARE*)
00000000  1  #INCLUDE INCLUDE:KIP      (*TYPE DEFINITIONS FOR DISPLAY-MONITOR COMMUNICATION*)
00000000  1  (*****************************************************************)
00000000  1  (********** KIPNIX ***********************************************)
00000000  1  (*****************************************************************)
00000000  1  VAR ERROR:INT;  (*0==> NO ERROR, NOT 0==> FATAL ERROR, KILL DISPLAY SOFTWARE*)
00000000  1
00000000  1  (*****************************************************************)
00000000  1  (********** OPSYS PROCEDURES *************************************)
00000000  1  (*****************************************************************)
```

```
00000000 1 PROCEDURE OUTIT        (LETTER:CHAR;VALUE:INT;BASE:CHAR); EXTERNAL;
00000000 1 PROCEDURE SET_PRI_     (PRI:INT);EXTERNAL;
00000000 1 PROCEDURE SET_SIG_     (SIG:INTEGER);EXTERNAL;
00000000 1 PROCEDURE SLEEP_       (CHANNNEL:INTEGER; PRIORITY:INT); EXTERNAL;
00000000 1 PROCEDURE EXIT_        ;EXTERNAL;
00000000 1 PROCEDURE READ_SIG_    (PROCESSID:INT; VAR SIGNAL: INTEGER); EXTERNAL;
00000000 1 PROCEDURE READ_PID_    (VAR ID:INT); EXTERNAL;
00000000 1 PROCEDURE READ_ID_     (VAR ID:INT); EXTERNAL;
00000000 1
00000000 1 (*************************************************************************)
00000000 1 (********** INTERFACE TO DISPLAY SOFTWARE ******************************)
00000000 1 (*************************************************************************)
00000000 1 PROCEDURE INIT         (VAR ERROR:INT); EXTERNAL;
00000000 1 PROCEDURE MAIN         (MONITOR:DISPLAY_SPEC_PTR; VAR ERROR:INT); EXTERNAL;
00000000 1 PROCEDURE CONCLUDE     ;EXTERNAL;
00000000 1 PROCEDURE LOADMEMORY   ;EXTERNAL; (*Allows display of footdc file by loading it into soda memory*)
00000000 1 $PAGE$
00000000 1 (*************************************************************************)
00000000 1 (********** KIPMIX *****************************************************)
00000000 1 (*************************************************************************)
00000000 1 (* INPUTS:                                                               *)
00000000 1 (* SIGNAL      SIGNAL FROM MONITOR POINTS TO CONTROL STRUCTURE          *)
00000000 1 (*************************************************************************)
00000000 1 (* ERRORS: The display main program is responsible for displaying       *)
00000000 1 (* errors.  If a non fatal error is detected, the main program will     *)
00000000 1 (* display the error and then clear the error flag before returning     *)
00000000 1 (* to this procedure (or Joe).  If the error is fatal the error flag    *)
00000000 1 (* will not be cleared.  If the error flag is not 0, KIPMIX (or Joe)    *)
00000000 1 (* will refuse to call the main display software.                       *)
00000000 1 (*                                                                       *)
00000000 1 (* This scheme displays fatal errors only once. If this becomes a       *)
00000000 1 (* problem, A non zero error code could be sent to the main program     *)
00000000 1 (* which would display the error again and return with no further       *)
00000000 1 (* action.                                                               *)
00000000 1 (*************************************************************************)
00000000 1 PROCEDURE KIPMIX;
00000000 2 CONST
00000000 2 HIGH_PRIORITY   =-55;                 (*PRIORITY*)
00000000 2 NORMAL_PRIORITY = 00;                 (*PRIORITY*)
00000000 2
00000000 2 VAR
00000000 2 CHANNEL        :INTEGER;              (*CHANNEL NUMBER*)
00000004 2 RUNNING        :INTEGER;              (*My signal value specifying I am running*)
00000008 2 SLEEPING       :INTEGER;              (*My signal value specifying I am sleeping*)
0000000C 2 KILLED         :INTEGER;              (*My signal value specifying I am killed*)
00000010 2 PID            :INT;                  (*PARENT ID NUMBER*)
00000012 2 MONITOR        :DISPLAY_SPEC_PTR;     (*PT TO THE DISPLAY SPEC STRUCURE*)
00000004 2
00000004 2 BEGIN  (*PROCEDURE KIMIX*)
00000004 2 SET_PRI_(HIGH_PRIORITY);        (*I HAS JUST FORKED, SET MY PRIORITY*)
00000010 2 CHANNEL[0]  :=1;                (*Initialize CHANNEL integer to 10000H*)
00000016 2 CHANNEL[1]  :=0;                (*Initialize CHANNEL integer to 10000H*)
0000001A 2 RUNNING[0]  :=0;                (*Initialize RUNNING integer, 1 ==> running *)
0000001E 2 RUNNING[1]  :=1;                (*Initialize RUNNING integer, 1 ==> running *)
00000024 2 SLEEPING[0] :=0;                (*Initialize SLEEPING integer, 2 ==> speeping *)
00000028 2 SLEEPING[1] :=2;                (*Initialize SLEEPING integer, 2 ==> sleeping *)
0000002E 2 KILLED[0]   :=0;                (*Initialize KILLED  integer, 0 ==> killed *)
00000032 2 KILLED[1]   :=0;                (*Initialize KILLED  integer, 0 ==> killed *)
00000036 2 SET_SIG_(RUNNING);              (*SET MY SIGNAL, IM RUNNING*)
00000042 2 SET_PRI_(NORMAL_PRIORITY);
0000004C 2 READ_PID_(PID);                 (*READ PARENT'S ID AND SAVE*)
00000058 2 READ_SIG_(PID,INTEGER(MONITOR));(*READ PARENT'S SIGNAL TO FIND POINTER TO CONTROL STRUCTURE*)
00000068 2
00000068 2 (*DEBUG1*)
00000068 2 IF MONITOR^.DUMMY=TRUE THEN LOADMEMORY; (*DEBUG1 IS ON*)
0000007E 2 (*DEBUG1*)
0000007E 2
0000007E 2 (*Im now awake and running. By definition there is a footdc ready.            *)
0000007E 2 (*I will initialize the measurement, symbol table & memory pool based on the footdc *)
0000007E 2 (*Then I will look at COMMAND to decide if to display anything                  *)
0000007E 2 ERROR:=0;
00000082 2 INIT(ERROR); (*Initialize measurment, symbol table and memory pool but don't dispaly*)
0000008E 2 MONITOR^.CMD:=POSITION; (*The command must always be POSITION on first call to MAIN*)
00000098 2 (* MONITOR^.LOCATION is assigned by the MONITOR so that it can reposition like last measurement *)
```

```
00000098 2 WHILE MONITOR^.CMD<>KILL DO
000000A8 2   BEGIN  (*WHILE LOOP*)
000000A8 2    IF ERROR=0 THEN  (*Call the main program only if there is no error*)
000000B0 2      BEGIN
000000B0 2       SET_PRI_(NORMAL_PRIORITY);
000000BA 2       MAIN(MONITOR,ERROR); (*Call the main program only if there is no error*)
000000CA 2       SET_PRI_(HIGH_PRIORITY);
000000D6 2      END;
000000D6 2    SET_SIG_(SLEEPING);                (*SET MY SIGNAL, IN ASLEEP*)
000000E2 2    SLEEP_(CHANNEL,HIGH_PRIORITY);     (*GO TO SLEEP, WAIT FOR SIGNAL*)
000000F2 2    SET_SIG_(RUNNING);                 (*SET MY SIGNAL, IN RUNNING*)
000000FE 2    END;(*WHILE LOOP*)
00000100 2
00000100 2  (*COMMAND IS KILL, CALL CONCLUDE TO CLOSE FOOTDC AND RELEASED MEMEORY*)
00000100 2  CONCLUDE;
00000106 2  SET_SIG_(KILLED);                 (*SET MY SIGNAL, IN KILLED*)
00000112 2  EXIT_;
00000118 2  END;.  (*PROCEDURE KIPMIX*)

End of compilation, number of errors=    0

00000000 1  "68000" PREPROCESS
00000000 1  #DEFINE M68000 TRUE
00000000 1  (*****************************************************************************************)
00000000 1  (**********  SCREEN **************************************************************************)
00000000 1  (*****************************************************************************************)
00000000 1  (* FORMAT AND DISPLAY ONE SCREEN                                                            *)
00000000 1  (*****************************************************************************************)
00000000 1  PROGRAM PSCREEN;
00000000 1  $EXTENSIONS ON$
00000000 1  $WIDTH 120$
00000000 1  $LIB_ABS_LONG$
00000000 1  $CALL_ABS_LONG+$
00000000 1  #INCLUDE TYPES:KIP         (*TYPE DEFINITIONS FOR DISPLAY SOFTWARE*)
00000000 1
00000000 1  TYPE
00000000 1  SCREEN_TYPE    =ARRAY[0..15,0..39] OF INT;
00000000 1  SCREEN_PTR     =^SCREEN_TYPE;
00000000 1
00000000 1  VAR
00000000 1  SCREEN       :SCREEN_PTR;
00000004 1  $EXTVAR ON$
00000004 1  VAR
00000004 1  ENVIRONMENT:ENVIRONMENT_PTR;
00000004 1  $EXTVAR OFF$
00000004 1  $PAGE$
00000000 1  (*************************************************************************)
00000000 1  (********** PROCEDURES ***************************************************)
00000000 1  (*************************************************************************)
00000000 1  PROCEDURE FORMAT          (SIGN_FLAG:INT;SOURCE:PTR; SOURCESIZE:INT;
00000000 2                            DEST:PTR; DEST_OFFSET:INT; VAR DESTSIZE:INT; BASE:INT; JUSTIFY:INT); EXTERNAL;
00000000 1  PROCEDURE MOVEBYTES       (SOURCE:PTR; SOURCE_OFFSET:INT; DEST:PTR; DEST_OFFSET:INT; COUNT:INT); EXTERNAL;
00000000 1  PROCEDURE PUTCHAR         (DEST:PTR; DEST_OFFSET:INT; CHARACTER:CHAR); EXTERNAL;
00000000 1  PROCEDURE P_MESSAGE       (P:PTR;CODE:INT);EXTERNAL;
00000000 1  #IF M68000
00000000 1  PROCEDURE BPC_WRITE       (ADDR_68K:INTEGER; ADDR_BPC,LENGTH:INT);EXTERNAL;
00000000 1  #ENDIF
00000000 1  $PAGE$
00000000 1  $GLOBPROC ON$
00000000 1  (*************************************************************************)
00000000 1  (********** STATUS LINE **************************************************)
00000000 1  (*************************************************************************)
00000000 1  (* Write message to status line.                                          *)
00000000 1  (*************************************************************************)
00000000 1  (* INPUTS:                                                                *)
00000000 1  (* STATUS_MESSAGE Ptr to STRNG, byte count in first word                 *)
00000000 1  (* CODE           MESSAGE code (error, status, stacked, timeout, ect). *)
00000000 1  (* POSITION       Abs position to be formatted. Neg ==> dont format it.*)
00000000 1  (*************************************************************************)
00000000 1  PROCEDURE STATUS_LINE(STATUS_MESSAGE:STRNG_PTR; CODE:INT; ABS_POSITION:INT);
00000000 2  CONST
00000000 2  ON_UNDERSCORE=CHAR(0A0H);
00000000 2  OFF_ENHANCE  =CHAR(080H);
00000000 2
00000000 2  TYPE
```

```
00000000  2  LINE         =ARRAY[0..32] OF INT; (*Word count in word 0, followed by 64 bytes of ascii*)
00000000  2  LINE_PTR     =^LINE;
00000000  2
00000000  2  VAR
00000000  2  FOO          :LINE_PTR;
00000004  2  REL_POSITION :INT; (*Position reletive to trigger position*)
00000006  2  DESTSIZE     :INT;
00000008  2  I            :INT;
00000004  2
00000004  2  BEGIN
00000004  2  NEW (FOO);
00000016  2  FOR I:=1 TO 32 DO  FOO^[I]:=2020H;
0000003C  2  MOVEBYTES(PTR(STATUS_MESSAGE),2, PTR(FOO),2, STATUS_MESSAGE^.LEN+1); (*Move string+PAD CHAR to line*)
00000062  2  IF ABS_POSITION<0 THEN
0000006A  2    BEGIN  (*Don't format position*)
0000006A  2    FOO^[0]:=(STATUS_MESSAGE^.LEN+1) DIV 2; (*Convert byte count to word count*)
0000007E  2    END    (*Don't format position*)
00000082  2    ELSE
00000082  2    BEGIN  (*Do format position*)
00000082  2    FOO^[0]:=31;                                       (*Always write 62 char status line*)
0000008A  2    PUTCHAR (PTR(FOO),STATUS_MESSAGE^.LEN+2,ON_UNDERSCORE); (*Turn on underscore at end of string*)
000000A4  2    PUTCHAR (PTR(FOO),56,OFF_ENHANCE);                 (*Turn off enhance before position*)
000000B8  2    PUTCHAR (PTR(FOO),65,ON_UNDERSCORE);               (*Turn on underscore at end of position*)
000000CC  2    DESTSIZE:=4;
000000D2  2    REL_POSITION:=ABS_POSITION+ENVIRONMENT^.TRIG_POSITION;
000000E2  2    FORMAT(SIGNED, PTR(ADDR(REL_POSITION)), 2, PTR(FOO),59,DESTSIZE,10,RIGHT)
00000110  2    END;   (*Do format position*)
00000110  2  P_MESSAGE(PTR(FOO),CODE); (*Write message, do not stack, clear on new message*)
00000120  2  DISPOSE (FOO);
00000132  2  END;
00000000  1  $PAGE$
00000000  1  $GLOBPROC ON$
00000000  1  (************************************************************************)
00000000  1  (********** INIT_SCREEN *************************************************)
00000000  1  (************************************************************************)
00000000  1  (* If 68000 then NEW a 16*80 array (corrosponds 1:1 w/physical screen).  *)
00000000  1  (************************************************************************)
00000000  1  PROCEDURE INIT_SCREEN;
0000013A  2  BEGIN
0000013A  2  $IF M68000
0000013A  2  NEW(SCREEN);
0000014C  2  $ELSE
0000014C  2  SCREEN:=SCREEN_PTR(0FA68H);
0000014C  2  $ENDIF
0000014C  2  END;
00000000  1  $PAGE$
00000000  1  $GLOBPROC ON$
00000000  1  (************************************************************************)
00000000  1  (********** WRITE SCREEN ************************************************)
00000000  1  (************************************************************************)
00000000  1  (* If BPC   then SCREEN pts to 0FA68H, address of BPC screen.           *)
00000000  1  (* If 68000 then SCREEN pts to a NEWed array and must be copied to 0FA68H*)
00000000  1  (*                                                                      *)
00000000  1  (*         0  1               <--- 40 WORDS --->                39     *)
00000000  1  (*word     |----------------------------------------------------|     *)
00000000  1  (*FA18     |  64xxx Software anaylzer ect...                     |     *)
00000000  1  (*         |----------------------------------------------------|     *)
00000000  1  (*FA40     |  blank line                                         |     *)
00000000  1  (*         |----------------------------------------------------|     *)
00000000  1  (*FA68   0 |e column headings w/enhancements       /|\          |     *)
00000000  1  (*FA90   1 |e  /|\                                  |           |     *)
00000000  1  (*FAB8   2 |e  data                               SCREEN        |     *)
00000000  1  (*     ... |e   |                                   |           |     *)
00000000  1  (*FCC0  15 |e  \|/                                 \|/          |     *)
00000000  1  (*         |----------------------------------------------------|     *)
00000000  1  (*FCE8     |  blank line                                         |     *)
00000000  1  (*FD10     |  status line                                        |     *)
00000000  1  (*FD38     |  blank line                                         |     *)
00000000  1  (*FD60     |  command line                                       |     *)
00000000  1  (*FD88     |  command line                                       |     *)
00000000  1  (*FDB0     |  command line                                       |     *)
00000000  1  (*FDD8     |  softkeys                                           |     *)
00000000  1  (*         |----------------------------------------------------|     *)
00000000  1  (************************************************************************)
```

```
00000000 1  (* INPUTS:                                                         *)
00000000 1  (* HEADINGS    ARRAY OF COLUMN HEADINGS                             *)
00000000 1  (* BIGBUFF     ALL INFOR FOR FMT DISPLAY LINE                       *)
00000000 1  (* COLUMN      COLUMN INTO VERTUAL DISPLAY                          *)
00000000 1  (* TOP         PHYSICAL INDEX INTO BIGBUFF FOR LOGICAL TOP OF DISPLAY *)
00000000 1  (*********************************************************************)
00000000 1  PROCEDURE WRITE_SCREEN(HEADINGS:STRNG_PTR; BIGBUFF:BIGBUFF_PTR; COLUMN,TOP:INT);
00000000 2  CONST
00000000 2  LINE2WORD      =0FA68H;
00000000 2  VAR
00000000 2  I       :INT;  (*COUNT # OF DATA LINES MOVED*)
00000002 2  ROW     :INT;
00000154 2
00000154 2  BEGIN
00000154 2  ROW:=TOP;
0000015A 2  FOR I:=1 TO DATALINES   DO
00000160 2    BEGIN (*Move data lines & off enhancement*)
00000160 2    MOVEBYTES(PTR(ADDR(BIGBUFF^[ROW].TEXT.ASCII)), COLUMN, PTR(ADDR(SCREEN^[I,0])) ,1,79);  (*Move 79 bytes of data*)
000001A4 2    IF I <> 8 THEN PUTCHAR(PTR(ADDR(SCREEN^[I,0])),0,CHAR(080H)); (*To avoid flicker, off enhance only if row <> 8*)
000001D0 2    ROW:=(ROW+1) MOD DATALINES;
000001E8 2    END;  (*Move data lines & off enhancement*)
000001FA 2  MOVEBYTES(PTR(ADDR(HEADINGS^.ASCII)),COLUMN, PTR(SCREEN),1,79);    (*Move 79 bytes of column heading*)
00000220 2  PUTCHAR(PTR(ADDR(SCREEN^[8,0])),0,CHAR(090H)); (*On inverse vidio*)
00000238 2  PUTCHAR(PTR(ADDR(SCREEN^[0,0])),0,CHAR(0A0H)); (*On underscore*)
0000024C 2  #IF M68000
0000024C 2  BPC_WRITE(INTEGER(ADDR(SCREEN^[0,0])),LINE2WORD,  640); (*WORD COUNT,=40*16*)
00000262 2  #ENDIF
00000262 2  END;.

End of compilation, number of errors=    0
00000000 1  "68000" PREPROCESS
00000000 1  #DEFINE M68000 TRUE
00000000 1  (*********************************************************************************************)
00000000 1  (********** TRACE VARAIBLES ******************************************************************)
00000000 1  (*********************************************************************************************)
00000000 1  PROGRAM PTRACEVAR;
00000000 1  $EXTENSIONS ON$
00000000 1  $WIDTH 120$
00000000 1  $LIB_ABS_LONG$
00000000 1  $CALL_ABS_LONG+$
00000000 1  #INCLUDE "TYPES:KIP"
00000000 1  $EXTVAR ON$
00000000 1  VAR ENVIRONMENT:ENVIRONMENT_PTR;
00000000 1  $EXTVAR OFF$
00000000 1  (*********************************************************************)
00000000 1  (********* LOCAL STATICS *********************************************)
00000000 1  (*********************************************************************)
00000000 1  VAR
00000000 1  RAW               :DATAREC_PTR;
00000000 1
00000000 1  (*********************************************************************)
00000000 1  (*********** PROCEDURES **********************************************)
00000000 1  (*********************************************************************)
00000000 1  PROCEDURE FMTSYM     (VAR SYM:STRNG; VAR P:PTR; BUSS_ADDR:INTEGER; LANGUAGE:INT; VAR STRUC_ADDR:INTEGER;
00000000 2                       BYTE_INDEX:INT; VAR STRUC_SIZE:INT; VAR PAD:BOOLEAN; RAW:DATAREC_PTR);  EXTERNAL;
00000000 1  PROCEDURE FMTVAL     (VAR VAL:STRNG; VAR P:PTR; VAR STRUC:STRUC_TYPE;
00000000 2                       VAR USED:STRUC_TYPE; COUNTER:INT; PAD:BOOLEAN);  EXTERNAL;
00000000 1  PROCEDURE READFWD    (VAR RAW:DATAREC_PTR; VAR DATA_BYTE:BYTE; VAR DATA_ADDR:INTEGER;
00000000 2                       VAR BYTE_INDEX, SYMBOL_NO:INT; VAR LOC:INT; VAR ERROR:INT); EXTERNAL;
00000000 1  PROCEDURE READBKWD   (VAR RAW:DATAREC_PTR; VAR DATA_BYTE:BYTE; VAR DATA_ADDR:INTEGER;
00000000 2                       VAR BYTE_INDEX, SYMBOL_NO:INT; VAR LOC:INT; VAR ERROR:INT); EXTERNAL;
00000000 1  PROCEDURE GETSOURCE1 (REQ_PC:INTEGER;  REQ_SYM:PTR; VAR SOURCELINE:STRNG;
00000000 2                       VAR SOURCELINE_NO:INT; VAR SOURCELINE_PATH:PATH_TYPE; VAR ERROR:INT); EXTERNAL;
00000000 1  PROCEDURE ADD32      (OP1,OP2:INTEGER; VAR RESULT:INTEGER);EXTERNAL;
00000000 1  PROCEDURE SUBTRACT32 (OP1,OP2:INTEGER; VAR RESULT:INTEGER);EXTERNAL;
00000000 1  PROCEDURE MOVEBYTES  (SOURCE:PTR; SOURCE_OFFSET:INT; DEST:PTR; DEST_OFFSET:INT; COUNT:INT); EXTERNAL;
00000000 1  PROCEDURE INITGETSOURCE1;EXTERNAL;
00000000 1  $PAGE$
00000000 1  $GLOBPROC+$
00000000 1  (*********************************************************************)
00000000 1  (********** INITIALIZE TRACE VARIABLES *******************************)
00000000 1  (*********************************************************************)
00000000 1  PROCEDURE INIT_TRACEVAR;
00000004 2  BEGIN
```

```
00000004  2  INITGETSOURCE1;
0000000A  2  END;
00000000  1
00000000  1
00000000  1
00000000  1  $GLOBPROC OFF$
00000000  1  (***************************************************************************)
00000000  1  (********** IN_STRUC *******************************************************)
00000000  1  (***************************************************************************)
00000000  1  (* See if current data byte is in current structure.                       *)
00000000  1  (***************************************************************************)
00000000  1  (* INPUTS:                                                                 *)
00000000  1  (* RAW         Pointer to footdc data record.                              *)
00000000  1  (* DATA_ADDR   Address of data byte.                                       *)
00000000  1  (* PRIMITIVE   Information about current STRUC.                            *)
00000000  1  (***************************************************************************)
00000000  1  (* OUTPUTS:                                                                *)
00000000  1  (* IN_STRUC      TRUE  iff DATA_ADDR in current STRUC.                     *)
00000000  1  (*               FALSE iff DATA_ADDR not in current STRUC.                 *)
00000000  1  (***************************************************************************)
00000000  1  FUNCTION IN_STRUC(DATA_ADDR:INTEGER; RAW:DATAREC_PTR; PRIMITIVE:PRIMITIVE_PTR):BOOLEAN;
00000001  2  VAR J:INT;
00000004  2  TEMP              :INTEGER;      (*TEMPORARY FOR TYPE CHANGING INTGERS*)
00000008  2  CURR_STATUS       :STATUS_TYPE;
00000012  2  BEGIN WITH PRIMITIVE^ DO BEGIN
00000018  2  SUBTRACT32(DATA_ADDR,STRUC_ADDR,TEMP);
00000034  2  J:=TEMP[1];
0000003A  2  IF RAW^.WRITE_STATUS
00000046  2    THEN CURR_STATUS:=WRITEE
00000050  2    ELSE CURR_STATUS:=READD;
00000054  2  IN_STRUC:=FALSE;
00000058  2  IF J>=0
00000060  2    THEN IF J<PRIMITIVE^.STRUC_SIZE
00000070  2      THEN IF PRIMITIVE^.STATUS=CURR_STATUS
0000007C  2        THEN IF PRIMITIVE^.USED[J]=BYTE(0)
00000088  2          THEN IN_STRUC:=TRUE;
0000008E  2  END; END;
00000000  1  $PAGE$
00000000  1  $GLOBPROC-$
00000000  1  (***************************************************************************)
00000000  1  (******** ADJACENT *********************************************************)
00000000  1  (***************************************************************************)
00000000  1  (* Determin if the new data byte in the footdc is adjacent to the STRUC*)
00000000  1  (* that I am trying to byild.  If not prefetch processor then add a        *)
00000000  1  (* test to see if byte of data is from the same source line.               *)
00000000  1  (***************************************************************************)
00000000  1  (* INPUTS:                                                                 *)
00000000  1  (* PRIMITIVE   Information about current STRUC.                            *)
00000000  1  (* DATA_ADDR   Address of data byte iff RAW^ is a data cycle.              *)
00000000  1  (* RAW         Pointer to footdc data record.                              *)
00000000  1  (* ERROR       Error flag from most recient fngr read.                     *)
00000000  1  (***************************************************************************)
00000000  1  (* OUTPUTS:                                                                *)
00000000  1  (* ADJACENT    TRUE if data byte and part of currentr STRUC.               *)
00000000  1  (***************************************************************************)
00000000  1  FUNCTION ADJACENT(PRIMITIVE:PRIMITIVE_PTR; DATA_ADDR:INTEGER; RAW:DATAREC_PTR;ERROR:INT):BOOLEAN;
0000009C  2
0000009C  2  BEGIN
0000009C  2  ADJACENT:=FALSE;
000000A0  2  IF ERROR=0
000000A8  2    THEN IF (RAW^.TYP=STATIC_) OR (RAW^.TYP=DYNAMIC_)
000000CE  2      THEN IF IN_STRUC(DATA_ADDR,RAW,PRIMITIVE)
000000EC  2        THEN ADJACENT:=TRUE;
000000F2  2  END;
00000000  1  $PAGE$
00000000  1  $GLOBPROC+$
00000000  1  (***************************************************************************)
00000000  1  (********** TRACE VARIABLES ************************************************)
00000000  1  (***************************************************************************)
00000000  1  (* INPUTS:                                                                 *)
00000000  1  (* REFLINE     Referencing line in BIGBUFF, with info for new line.        *)
00000000  1  (* DIRECTION   Direction to move in footdc data.                           *)
00000000  1  (***************************************************************************)
00000000  1  (* OUTPUTS:                                                                *)
```

```
00000000 1  (* PRIMITIVE  All info about curr strucure needed to fmt display line.*)
00000000 1  (* ERROR      0 = PRIMITIVE built as requested.                       *)
00000000 1  (*************************************************************************)
00000000 1  PROCEDURE TRACEVAR (PRIMITIVE:PRIMITIVE_PTR; DIRECTION:INT;CURR:INT; VAR ERROR:INT);
00000000 2  LABEL 1;
00000000 2  VAR
00000000 2  ADJACENT_FLAG     :BOOLEAN;   (*TRUE if current reocrd is part of current primitive*)
00000001 2  DATA_BYTE         :BYTE;      (*Data byte from RAW^*)
00000002 2  DATA_ADDR         :INTEGER;   (*Physical address of DATA_BYTE*)
00000006 2  SYMBOL_NO         :INT;       (*Index into symbol table from RAW^*)
00000008 2  BYTE_INDEX        :INT;       (*Which byte in RAW^.BUSS_DATA*)
0000000A 2  J                 :INT;       (*Index into structure being built*)
0000000C 2  SYMBOL            :SYMBOLPTR; (*Pointer to the symbol table symbol of intrest*)
00000010 2  P                 :PTR;       (*This is the pointer that traverses the data base*)
00000014 2  TEMP              :INTEGER;   (*Temporary for storing results of 32 bit subtracts*)
00000018 2  PC                :INTEGER;   (*Program counter of intrest*)
00000100 2
00000100 2  BEGIN WITH PRIMITIVE^ DO BEGIN
00000106 2  (***** PRIMING READ ******************************************************)
00000106 2  IF DIRECTION=FWD
0000010E 2    THEN READFWD (RAW,DATA_BYTE,DATA_ADDR,BYTE_INDEX,SYMBOL_NO,CURR,ERROR)
0000013C 2    ELSE READBKWD(RAW,DATA_BYTE,DATA_ADDR,BYTE_INDEX,SYMBOL_NO,CURR,ERROR);
00000166 2  IF ERROR<>0 THEN GOTO 1;
00000174 2  KC9A:=RAW^.KC9A;   (* RESET TO ZERO IF THIS IS A MESSAGE *)
00000188 2  IF DIRECTION=FWD
00000190 2    THEN ENDING  :=CURR
0000019E 2    ELSE STARTING:=CURR;
000001A8 2  $PAGE$
000001A8 2  CASE RAW^.TYP OF
000001B6 2  MESSAGE_:
000001B6 2  (********** PROCESS MESSAGE RECORD ******************************************)
000001B6 2  BEGIN (*Process message record*)
000001B6 2  KC9A[0] := 0;
000001C0 2  KC9A[1] := 0;
000001CC 2  KC9A[2] := 0;
000001D8 2  KC9A[3] := 0;
000001E4 2  PRIMITIVE^.MESSAGE:=TRUE; (*Set special message flag*)
000001EE 2  PRIMITIVE^.SYM.LEN:=(RAW^.LEN-1)*2; (*Word count to byte count, dont count record type word*)
00000204 2  MOVEBYTES(PTR(ADDR(RAW^.LEN)), 4, PTR(ADDR(PRIMITIVE^.SYM.LEN)), 2, SYM.LEN);
00000234 2  END;  (*Process message record*)
00000238 2  $PAGE$
00000238 2  STATIC_,DYNAMIC_:
00000238 2  (********** PROCESS VARIABLES RECORD ****************************************)
00000238 2  BEGIN (*Process variable records*)
00000238 2  PC:=RAW^.PC;
00000242 2  SYMBOL  :=ENVIRONMENT^.SYMBOL_TABLE[SYMBOL_NO];  (*Get pointer to correct symbol in symbol table*)
00000256 2  P       :=PTR(ADDR(SYMBOL^.DATABASE));           (*Initialize P to point to start of data base*)
00000262 2  IF RAW^.WRITE_STATUS
0000026E 2    THEN STATUS:=WRITEE
0000027C 2    ELSE STATUS:=READD;
00000284 2  CASE RAW^.TYP OF (*Find absolute address of structure*)
00000292 2    STATIC_  :STRUC_ADDR:=SYMBOL^.DATABASE.ADDRESS; (*GET STRUC ADDR FROM DATA BASE*)
000002A4 2    DYNAMIC_ :ADD32(SYMBOL^.DATABASE.ADDRESS,RAW^.STACK,STRUC_ADDR);    (*STRUC ADDR:=VARIABLE'S STACK OFFSET + STACK*)
000002CC 2    OTHERWISE;
000002CC 2    END;
000002F0 2  FMTSYM(SYM,P,DATA_ADDR,SYMBOL^.LANGUAGE,STRUC_ADDR,BYTE_INDEX,STRUC_SIZE,PAD,RAW);
00000328 2  FOR J:=0 TO STRUC_SIZE-1 DO BEGIN STRUC[J]:=0; USED[J]:=BYTE(FALSE); END;
00000374 2  SYM_PATH:=SYMBOL^.PATH; (*Get symbol path*)
00000388 2
00000388 2  (*Adjacecy loop*)
00000388 2  ADJACENT_FLAG:=TRUE; (*FORCE FIRST ITERATION THROUGH LOOP*)
0000038E 2  WHILE ADJACENT_FLAG DO
00000396 2    BEGIN  (*Adjacency loop*)
00000396 2    SUBTRACT32(DATA_ADDR,PRIMITIVE^.STRUC_ADDR,TEMP); (*FIND INCEX INTO STRUC & USED ARRAY*)
000003B2 2    J:=TEMP[1];                                 (*LOOK AT LS 16 BITS*)
000003B8 2    STRUC[J]:=DATA_BYTE; (*MOVE ONE BYTE*)
000003CA 2    USED[J]:=BYTE(TRUE);                 (*MARK THE BYTE AS USED*)
000003DC 2    COUNTER:=COUNTER+1;                  (*INC USED COUNT*)
000003EA 2    IF DIRECTION=FWD
000003F2 2      THEN ENDING:=CURR
00000400 2      ELSE
00000400 2      BEGIN (*Get position, program counter and kc9a from earliest postion in primitive*)
00000400 2      PC:=RAW^.PC;
0000040A 2      STARTING:=CURR;
```

```
00000414  2        KC9A:=RAW^.KC9A;
00000428  2        END;  (*Get position, program counter and kc9a from earliest postion in primitive*)
00000428  2      IF DIRECTION=FWD
00000430  2        THEN READFWD (RAW,DATA_BYTE,DATA_ADDR,BYTE_INDEX,SYMBOL_NO,CURR,ERROR)  (*ERROR is checked by ADJACENT*)
0000045E  2        ELSE READBKWD(RAW,DATA_BYTE,DATA_ADDR,BYTE_INDEX,SYMBOL_NO,CURR,ERROR); (*ERROR is checked by ADJACENT*)
00000488  2      ADJACENT_FLAG:=ADJACENT(PRIMITIVE,DATA_ADDR,RAW,ERROR)
000004AA  2      END;   (*Adjacency loop*)
000004AE  2    IF ERROR=EOF THEN ERROR:=0;
000004C2  2    IF ERROR=0 THEN
000004CC  2      BEGIN
000004CC  2      FMTVAL(VAL,P,STRUC,USED,COUNTER,PAD);  (*FORMAT THE VALUE STRING*)
000004F4  2      GETSOURCE1(PC,PTR(ADDR(SYMBOL^.DATABASE.IDENTIFIER)),SOURCELINE,SOURCELINE_NO,SOURCELINE_PATH,ERROR);
00000524  2      IF ERROR<>0 THEN GOTO 1; (*ERROR will = 0 even if source line not found unless the error is fatal*)
00000532  2      END;
00000532  2    END;  (*Process variable reocrds*)
00000536  2    OTHERWISE;
00000536  2    END; (*END CASE*)
0000056E  2    1:END;END;. (*END WITH PRIMITIVE*) (*END PROCEDURE TRACEVAR*)

End of compilation, number of errors=    0

00000000  1   "68000" PREPROCESS
00000000  1   #DEFINE M68000 TRUE
00000000  1   (*************************************************************************************************)
00000000  1   (**********  TRACE MODULES ***********************************************************************)
00000000  1   (*************************************************************************************************)
00000000  1   PROGRAM PTRACEMOD;
00000000  1   $EXTENSIONS ON$
00000000  1   $WIDTH 120$
00000000  1   $LIB_ABS_LONG$
00000000  1   $CALL_ABS_LONG+$
00000000  1   #INCLUDE "TYPES:KIP"
00000000  1   $FAR$
00000000  1   $EXTVAR ON$
00000000  1   VAR
00000000  1   ENVIRONMENT:ENVIRONMENT_PTR;
00000000  1   $EXTVAR OFF$
00000000  1   (*****************************************************************************)
00000000  1   (******** LOCAL TYPES *******************************************************)
00000000  1   (*****************************************************************************)
00000000  1   CONST
00000000  1   MAX_PROC_COUNT        =30; (*MAX # OF PROC ENTRY/EXIT ADDRS IN PROC_ARRAY ie THINGS I KNOW ABOUT WITHOUT GOING TO DB
00000000  1
00000000  1   TYPE
00000000  1   RESULT_TYPE           =(FOUND,NOTFOUND);
00000000  1   PROC_ARRAY_PTR        =^PROC_ARRAY_TYPE;
00000000  1   PROC_ARRAY_TYPE       =ARRAY[1..MAX_PROC_COUNT] OF RECORD  (*ARRAY OF ENTRY/EXIT ADDRESSES I KNOW ABOUT*)
00000000  2     ENTRY_EXIT_ADDR     :INTEGER;  (*KEY TO TABLE, MUST MATCH DATA_ADDR (SAME AS RAW^.BUSS_ADDR)*)
00000000  2     PATH                :PATH_TYPE;
00000000  1     END;
00000000  1
00000000  1
00000000  1   (*****************************************************************************)
00000000  1   (******** LOCAL VARIABLES ***************************************************)
00000000  1   (*****************************************************************************)
00000000  1   VAR
00000000  1   RAW              :DATAREC_PTR;        (*PTR TO FOOTDC RECORD*)
00000004  1   PROC_ARRAY       :PROC_ARRAY_PTR;     (*PTR TO ARRAY OF ENTRY,EXIT ADDRESS I KNOW ABOUT*)
00000008  1   PROC_COUNT       :INT;                (*NUMBER OF PROCS IN PROC ARRAY*)
00000000  1
00000000  1   (*****************************************************************************)
00000000  1   (********** PROCEDURES ******************************************************)
00000000  1   (*****************************************************************************)
00000000  1   PROCEDURE READFWD         (VAR RAW:DATAREC_PTR; VAR DATA_BYTE:BYTE; VAR DATA_ADDR:INTEGER;
00000000  2                             VAR BYTE_INDEX, SYMBOL_NO:INT; VAR LOC:INT; VAR ERROR:INT); EXTERNAL;
00000000  1   PROCEDURE READBKWD        (VAR RAW:DATAREC_PTR; VAR DATA_BYTE:BYTE; VAR DATA_ADDR:INTEGER;
00000000  2                             VAR BYTE_INDEX, SYMBOL_NO:INT; VAR LOC:INT; VAR ERROR:INT); EXTERNAL;
00000000  1   PROCEDURE FMTSYMBOL       (SOURCE,DEST:PTR; OFFSET2:INT; VAR LEN:INT);EXTERNAL;
00000000  1   PROCEDURE WHICH_FILE      (ABS_FILE:PTR; ABS_DISC:INT; VAR DATA_ADDR:INTEGER; VAR FSTART,FEND:INTEGER;
00000000  2                             SOURCE_NAME:PTR; VAR SOURCE_DISC,RELOCATION,ERROR:INT);EXTERNAL;
00000000  1   PROCEDURE LINE_SUB        (SOURCE_NO:INT; VAR DATA_ADDR:INTEGER; VAR SUB_NO,ERROR:INT); EXTERNAL;
00000000  1   PROCEDURE SUB_NAME        (SOURCE_NO,SUB_NO:INT; SUB_NAME:PTR; VAR ERROR:INT); EXTERNAL;
00000000  1   PROCEDURE PROC_INIT       (SOURCE_NAME:PTR; VAR SOURCE_DISC:INT;
00000000  2                             VAR SOURCE_NO,PROCESSOR,LANGUAGE,ERROR:INT); EXTERNAL;
```

```
00000000 1 PROCEDURE STATUS_LINE      (P:STRNG_PTR;CODE:INT;POSITION:INT); EXTERNAL;
00000000 1 PROCEDURE FMT_PC           (PC:INTEGER;VAR S:STRNG); EXTERNAL;
00000000 1 PROCEDURE FMT_FILENOTFOUND (VAR FILENAME:FNERNAME; DISC:INT; VAR S:STRNG); EXTERNAL;
00000000 1 PROCEDURE MOVEBYTES        (SOURCE:PTR; SOURCE_OFFSET:INT; DEST:PTR; DEST_OFFSET:INT; COUNT:INT); EXTERNAL;
00000000 1 PROCEDURE FMTFILE          (SOURCE,DEST:PTR; DEST_OFFSET:INT; VAR LEN:INT);EXTERNAL;
00000000 1 PROCEDURE FORMAT           (SIGN_FLAG:INT;SOURCE:PTR; SOURCESIZE:INT;
00000000 2                            DEST:PTR; DEST_OFFSET:INT; VAR DESTSIZE:INT; BASE:INT; JUSTIFY:INT); EXTERNAL;
00000000 1 PROCEDURE INITGETSOURCE1  ;EXTERNAL;
00000000 1 PROCEDURE INITGETSOURCE2  ;EXTERNAL;
00000000 1 PROCEDURE GETSOURCE1       (REQ_PC:INTEGER;  REQ_SYM:PTR; VAR SOURCELINE:STRNG;
00000000 2                            VAR SOURCELINE_NO:INT; VAR SOURCELINE_PATH:PATH_TYPE; VAR ERROR:INT); EXTERNAL;
00000000 1 PROCEDURE GETSOURCE2       (REQ_PC:INTEGER; VAR LINE:STRNG; VAR LINE_NO:INT;
00000000 2                            VAR PATH:PATH_TYPE; VAR MIN,MAX:INTEGER; VAR ERROR:INT); EXTERNAL;
0000000A 1 $PAGE$
0000000A 1 $GLOBPROC ON$
00000000 1 (****************************************************************)
00000000 1 (********** INITIALIZE TRACE MODULES ****************************)
00000000 1 (****************************************************************)
00000000 1 PROCEDURE INIT_TRACEMOD;
00000004 2 BEGIN
00000004 2 NEW(PROC_ARRAY);  (*ALLOCATE FIXED SIZE PROC_ARRAY OF ENTRY/EXIT ADDESSES I KNOW ABOUT*)
00000016 2 PROC_COUNT:=0;    (*I CURRENTLY DONT KNOW ABOUT ANY   ENTRY/EXIT ADDRESSES*)
0000001A 2 #IF M68000
0000001A 2 INITGETSOURCE1;
00000020 2 #ELSE
00000020 2 INITGETSOURCE2;
00000020 2 #ENDIF
00000020 2 END;
00000000 1
00000000 1
00000000 1 $GLOBPROC OFF$
00000000 1 (****************************************************************)
00000000 1 (********** SEARCH PROC_ARRAY ***********************************)
00000000 1 (****************************************************************)
00000000 1 (* INPUTS:                                                       *)
00000000 1 (* DATA_ADDR   Address of data byte.                             *)
00000000 1 (****************************************************************)
00000000 1 (* OUTPUTS:                                                      *)
00000000 1 (* RESULT      Result of search.                                 *)
00000000 1 (* I           Index to pointer array iff found.                 *)
00000000 1 (****************************************************************)
00000000 1 PROCEDURE SEARCH_PROC_ARRAY(DATA_ADDR:INTEGER;  VAR I:INT; VAR RESULT:RESULT_TYPE);
00000000 2 VAR
00000000 2 DUMMY2:INT;
00000002 2 DUMMY4:INTEGER;
00000028 2 BEGIN
00000028 2 I:=1;
00000030 2 WHILE (I<=PROC_COUNT) AND  (DATA_ADDR<>PROC_ARRAY^[I].ENTRY_EXIT_ADDR) DO I:=I+1;
00000070 2 IF I<=PROC_COUNT
0000007E 2   THEN RESULT:=FOUND
00000088 2   ELSE RESULT:=NOTFOUND;
00000090 2 END;
00000000 1 $PAGE$
00000000 1 $GLOBPROC OFF$
00000000 1 (****************************************************************)
00000000 1 (********** GET PROC NAME ***************************************)
00000000 1 (****************************************************************)
00000000 1 (* Given PC, use the data base routines to find the subroutine   *)
00000000 1 (* information and add it to PROC_ARRAY^ so we have it localy and *)
00000000 1 (* hopefullty can avoid going to the data base next time we encounter *)
00000000 1 (* the PC.  If the subroutine information is found, add it to    *)
00000000 1 (* the next available location in PROC_ARRAY^. If PROC_          *)
00000000 1 (* ARRAY is full, always overwrite the last entry in the array.  *)
00000000 1 (****************************************************************)
00000000 1 (* INPUTS:                                                       *)
00000000 1 (* PC          Program counter.                                  *)
00000000 1 (****************************************************************)
00000000 1 (* OUTPUTS:                                                      *)
00000000 1 (* RESULT      Result of search.                                 *)
00000000 1 (* I           Index to pointer array iff found.                 *)
00000000 1 (* ERROR       0 ==> no error or non-fatal error handled and cleared *)
00000000 1 (*             not 0 ==> fatal error, abort.                     *)
00000000 1 (* SYM         Contains error message if not found.              *)
00000000 1 (****************************************************************)
```

```
00000000  1  PROCEDURE GET_PROC_NAME(PC:INTEGER; VAR I:INT; VAR RESULT:RESULT_TYPE; VAR SYM:STRNG;VAR ERROR:INT);
00000000  2  LABEL 1;
00000000  2  VAR
00000000  2  $EXTVAR ON$
00000000  2  E000:STRNG;
00000000  2  E001:STRNG;
00000000  2  E100:STRNG;
00000000  2  $EXTVAR OFF$
00000000  2  DUMMY:INT;      (*Dummy paramater for WHICH_FILE,PROG_INIT*)
00000002  2  DUMMY4:INTEGER;  (*Dummy paramater for WHICH_FILE*)
00000006  2  SOURCEFILE_NO:INT;
00000008  2  PROC_NO      :INT;
00000098  2  BEGIN
00000098  2  IF PROC_COUNT=MAX_PROC_COUNT
000000A4  2    THEN I:=MAX_PROC_COUNT  (*PROC_ARRAY^ IS FULL*)
000000B0  2    ELSE I:=PROC_COUNT+1;   (*PROC_ARRAY^ IS NOT FULL
000000BC  2  (* Assume that a procedure will not be found.  Since SYM_PATH info is*)
000000BC  2  (* obtainded from PROC_ARRAY[I], we initialize PROC_ARRAY[I].SOURCEFILE_NAME[0] *)
000000BC  2  (* and PROC_ARRAY[I].PROC_NAME[0] to 0.  Regrdless if the procedure name *)
000000BC  2  (* is found or not,  we can still get path information straignt from *)
000000BC  2  (* PROC_ARRAY[I]. If RESULT is NOT_FOUND, the path proc name or proc name and
000000BC  2  (* file name will be null*)
000000BC  2  RESULT:=NOTFOUND;  (*ASSUME NOT FOUND*)
000000C4  2  PROC_ARRAY^[I].PATH.SOURCEFILE_NAME[0]:=0;
000000DE  2  PROC_ARRAY^[I].PATH.PROC_NAME[0]:=0;
000000F8  2  $PAGE$
000000F8  2  WITH ENVIRONMENT^,PROC_ARRAY^[I].PATH DO
0000011C  2    BEGIN (*WITH*)
0000011C  2    WHICH_FILE(PTR(ADDR(ABSFILE_NAME)),ABSFILE_DISC,PC,DUMMY4,DUMMY4,
0000011C  2      PTR(ADDR(SOURCEFILE_NAME)),SOURCEFILE_DISC,DUMMY,ERROR);
00000152  2    IF ERROR<>0 THEN
0000015C  2      BEGIN (*WHICH_FILE error*)
0000015C  2      IF ERROR=NOT_FOUND THEN
0000016A  2        BEGIN (* "Program execution outside of absolute file (PC=nnnn)" *)
0000016A  2        MOVEBYTES(PTR(ADDR(E000)), 0, PTR(ADDR(SYM)), 0, E000.LEN+2);
00000192  2        FMT_PC(PC,SYM);
000001A4  2        ERROR:=0;
000001AA  2        END;  (* "Program execution outside of absolute file (PC=nnnn)" *)
000001AA  2      GOTO 1;
000001AE  2      END; (*WHICH_FILE error*)
000001AE  2
000001AE  2    PROG_INIT(PTR(ADDR(SOURCEFILE_NAME)),SOURCEFILE_DISC,SOURCEFILE_NO,PROCESSOR,DUMMY,ERROR);
000001DA  2    IF ERROR<>0 THEN
000001E4  2      BEGIN (*PROG_INIT error*)
000001E4  2      IF ERROR=DB_NOT_FOUND THEN
000001F2  2        BEGIN  (* "File not found, file=xxx:comp_db (PC=xxxx)" *)
000001F2  2        FMT_FILENOTFOUND(SOURCEFILE_NAME,SOURCEFILE_DISC,SYM);
0000020E  2        FMT_PC(PC,SYM);
00000220  2        ERROR:=0;      (*non-fatal error ==> clear ERROR*)
00000226  2        END;    (* "File not found, file=xxx:comp_db (PC=xxxx)" *)
00000226  2      GOTO 1;
0000022A  2      END; (*PROG_INIT error*)
0000022A  2
0000022A  2    LINE_SUB(SOURCEFILE_NO,PC,PROC_NO,ERROR); (* PC --> PROC_NO*)
00000248  2    IF (ERROR<>0) OR (PROC_NO=0) THEN
00000264  2      BEGIN (*LINE_SUB error*)
00000264  2      IF (ERROR=NOT_FOUND) OR (PROC_NO=0) THEN
00000284  2        BEGIN (* "No module name found (PC=nnnn)" *)
00000284  2        MOVEBYTES(PTR(ADDR(E001)), 0, PTR(ADDR(SYM)), 0, E000.LEN+2);
000002AC  2        FMT_PC(PC,SYM);
000002BE  2        ERROR:=0;
000002C4  2        END;  (* "No module name found (PC=nnnn)" *)
000002C4  2      GOTO 1;
000002C8  2      END; (*LINE_SUB error*)
000002C8  2
000002C8  2    SUB_NAME(SOURCEFILE_NO,PROC_NO,PTR(ADDR(PROC_NAME)),ERROR); (* PROC_NO --> PROC_NAME*)
000002EC  2    IF ERROR<>0 THEN
000002F6  2      BEGIN (*SUB_NAME error*)
000002F6  2      IF ERROR=NOT_FOUND THEN
00000304  2        BEGIN
00000304  2        STATUS_LINE(STRNG_PTR(ADDR(E100)),0C000H,-1); (*Output error to status line, clear on next keystoke*)
0000031C  2        END;
0000031C  2      GOTO 1;
```

```
00000320  2     END; (*SUB_NAME error*)
00000320  2
00000320  2    PROC_ARRAY^[I].ENTRY_EXIT_ADDR:=PC;
00000336  2    RESULT:=FOUND;
0000033C  2    IF PROC_COUNT <> MAX_PROC_COUNT THEN PROC_COUNT:=PROC_COUNT+1;
0000034C  2    END;  (*WITH*)
0000034C  2  1:END;
00000000  1  $PAGE$
00000000  1  $GLOBPROC ON$
00000000  1  (*************************************************************************)
00000000  1  (********** TRACE MODULES **************************************************)
00000000  1  (*************************************************************************)
00000000  1  (* INPUTS:                                                                  *)
00000000  1  (* REFLINE     Referencing line in BIGBUFF, with info for new line.         *)
00000000  1  (* DIRECTION   Direction to move in footdc data.                            *)
00000000  1  (*************************************************************************)
00000000  1  (* OUTPUTS:                                                                 *)
00000000  1  (* PRIMITIVE   Ptr to info needed to fmt display line.                      *)
00000000  1  (* ERROR       0 = PRIMITIVE built as requested.                            *)
00000000  1  (*************************************************************************)
00000000  1  PROCEDURE TRACEMOD  (PRIMITIVE:PRIMITIVE_PTR; DIRECTION:INT; CURR:INT; VAR ERROR:INT);
00000000  2  LABEL 1;
00000000  2  VAR
00000000  2  DATA_BYTE        :BYTE;       (*Data byte from RAW^*)
00000001  2  DATA_ADDR        :INTEGER;    (*Physical address of DATA_BYTE*)
00000006  2  SYMBOL_NO        :INT;        (*Index into symbol table from RAW^*)
00000008  2  BYTE_INDEX       :INT;        (*Which byte in RAW^.BUSS_DATA*)
0000000A  2  SYMBOL           :SYMBOLPTR;  (*Pointer to the symbol table symbol of intrest*)
0000000E  2  P                :PTR;        (*This is the pointer that traverses the data base*)
00000012  2  I                :INT;        (*Index into PROC_ARRAY*)
00000014  2  RESULT           :RESULT_TYPE;(*RESULT OF CALL TO GET_DATABASE*)
00000354  2  #IF NOT M68000
00000354  2  DUMMY4            :INTEGER;            (*Dummy min, max paramater for GETSOURCE2*)
00000354  2  #ENDIF
00000354  2
00000354  2  BEGIN WITH PRIMITIVE^ DO BEGIN
0000035A  2  (***** PRIMING READ ******************************************************)
0000035A  2  IF DIRECTION=FWD
00000362  2    THEN READFWD (RAW,DATA_BYTE,DATA_ADDR,BYTE_INDEX,SYMBOL_NO,CURR,ERROR)
00000390  2    ELSE READBKWD(RAW,DATA_BYTE,DATA_ADDR,BYTE_INDEX,SYMBOL_NO,CURR,ERROR);
000003BA  2  IF ERROR<>0 THEN GOTO 1;
000003C8  2  KC9A:=RAW^.KC9A;    (* SET TO ZERO IF THIS IS A MESSAGE *)
000003DC  2  IF DIRECTION=FWD
000003E4  2    THEN ENDING  :=CURR
000003F2  2    ELSE STARTING:=CURR;
000003FC  2  $PAGE$
000003FC  2  CASE RAW^.TYP OF
0000040A  2  MESSAGE_:
0000040A  2  (********** PROCESS MESSAGE RECORD *******************************************)
0000040A  2  BEGIN (*Process message record*)
0000040A  2  KC9A[0] := 0;
00000414  2  KC9A[1] := 0;
00000420  2  KC9A[2] := 0;
0000042C  2  KC9A[3] := 0;
00000438  2  PRIMITIVE^.MESSAGE:=TRUE; (*Set special message flag*)
00000442  2  PRIMITIVE^.SYM.LEN:=(RAW^.LEN-1)*2; (*Word count to byte count, dont count record type word*)
00000458  2  MOVEBYTES(PTR(ADDR(RAW^.LEN)), 4, PTR(ADDR(PRIMITIVE^.SYM.LEN)), 2, SYM.LEN);
00000488  2  END;  (*Process message record*)
0000048C  2  $PAGE$
0000048C  2  ENTRY_,EXITT_:
0000048C  2  (********** PROCESS ENTRY,EXIT RECORD *************************************)
0000048C  2  BEGIN (*Process entry, exit records*)
0000048C  2  SEARCH_PROC_ARRAY(RAW^.BUSS_ADDR,I,RESULT); (*Is it a procedure I already know about?*)
000004A8  2  IF RESULT=NOTFOUND THEN GET_PROC_NAME(RAW^.BUSS_ADDR,I,RESULT,SYM,ERROR);
000004DE  2  IF ERROR<>0 THEN GOTO 1;
000004EC  2  IF RESULT=NOTFOUND
000004F8  2    THEN (* Do nothing.  GET_PROC_NAME has put error message in PRIMITIVE.SYM.*)
000004FC  2    ELSE
000004FC  2    BEGIN (*PROC FOUND, BUILD THE PRIMITIVE, I IS INDEX TO PROC ARRAY*)
000004FC  2    SYM_PATH:=PROC_ARRAY^[I].PATH; (*Get symbol path*)
00000522  2    IF RAW^.TYP=ENTRY_
00000532  2      THEN STATUS:=ENTRYY
00000540  2      ELSE STATUS:=EXITT;
0000054A  2    INDENT:=RAW^.INDENT - ENVIRONMENT^.MIN_INDENT;
```

```
00000564  2     WITH PROC_ARRAY^[I].PATH DO IF STATUS=ENTRYY
0000058E  2  #IF M68000
0000058E  2        THEN GETSOURCE1(RAW^.PC, PTR(ADDR(PROC_NAME)),SOURCELINE, SOURCELINE_NO,SOURCELINE_PATH,ERROR)    (*scan*)
000005BE  2  #ELSE
000005BE  2        THEN GETSOURCE2(RAW^.PC, SOURCELINE, SOURCELINE_NO,SOURCELINE_PATH,DUMMY4,DUMMY4,ERROR)    (*no scan*)
000005BE  2  #ENDIF
000005BE  2        ELSE SOURCELINE.LEN:=0;  (*DONT DISPLAY SOURCE ON EXITS*)
000005C6  2     IF ERROR<>0 THEN GOTO 1; (*ERROR will = 0 even if source line not found unless the error is fatal*)
000005D4  2     FMTSYMBOL(PTR(ADDR(PROC_ARRAY^[I].PATH.PROC_NAME)),PTR(ADDR(SYM.ASCII)),0,SYM.LEN);
00000608  2     END;  (*PROC FOUND, BUILD THE PRIMITIVE, I IS INDEX TO PROC ARRAY*)
00000608  2  END;  (*Process entry, exit records*)
0000060C  2  OTHERWISE;
0000060C  2  END; (*END CASE*)
0000063E  2  1:END;END;. (*END WITH PRIMITIVE*) (*END PROCEDURE TRACEMOD*)

****WARNING ?? - Symbol: LABEL_1, is duplicated in the asmb_syn file.

End of compilation, number of errors=    0

00000000  1  "68000" PREPROCESS
00000000  1  #DEFINE M68000 TRUE
00000000  1  (********************************************************************************************)
00000000  1  (**********  TRACE DATA FLOW *****************************************************************)
00000000  1  (********************************************************************************************)
00000000  1  PROGRAM PTRACEDAT;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1  $EXTVAR ON$
00000000  1  VAR ENVIRONMENT:ENVIRONMENT_PTR;
00000000  1  $EXTVAR OFF$
00000000  1  (***********************************************************************)
00000000  1  (******** LOCAL STATICS (GENERAL) **************************************)
00000000  1  (***********************************************************************)
00000000  1  VAR
00000000  1  RAW                :DATAREC_PTR;
00000000  1
00000000  1  (***********************************************************************)
00000000  1  (********** PROCEDURES *************************************************)
00000000  1  (***********************************************************************)
00000000  1  PROCEDURE FMTSYMBOL  (SOURCE,DEST:PTR; DEST_OFFSET:INT; VAR LEN:INT);EXTERNAL;
00000000  1  PROCEDURE FMTSYM     (VAR SYM:STRNG; VAR P:PTR; BUSS_ADDR:INTEGER; LANGUAGE:INT; VAR STRUC_ADDR:INTEGER;
00000000  2                       BYTE_INDEX:INT; VAR STRUC_SIZE:INT; VAR PAD:BOOLEAN; RAW:DATAREC_PTR);  EXTERNAL;
00000000  1  PROCEDURE FMTVAL     (VAR VAL:STRNG; VAR P:PTR; VAR STRUC:STRUC_TYPE;
00000000  2                       VAR USED:STRUC_TYPE; COUNTER:INT; PAD:BOOLEAN);  EXTERNAL;
00000000  1  PROCEDURE READFWD    (VAR RAW:DATAREC_PTR; VAR DATA_BYTE:BYTE; VAR DATA_ADDR:INTEGER;
00000000  2                       VAR BYTE_INDEX, SYMBOL_NO:INT; VAR LOC:INT; VAR ERROR:INT); EXTERNAL;
00000000  1  PROCEDURE READBKWD   (VAR RAW:DATAREC_PTR; VAR DATA_BYTE:BYTE; VAR DATA_ADDR:INTEGER;
00000000  2                       VAR BYTE_INDEX, SYMBOL_NO:INT; VAR LOC:INT; VAR ERROR:INT); EXTERNAL;
00000000  1  PROCEDURE GETSOURCE1 (REQ_PC:INTEGER;  REQ_SYM:PTR; VAR SOURCELINE:STRNG;
00000000  2                       VAR SOURCELINE_NO:INT; VAR SOURCELINE_PATH:PATH_TYPE; VAR ERROR:INT); EXTERNAL;
00000000  1  PROCEDURE ADD32      (OP1,OP2:INTEGER; VAR RESULT:INTEGER);EXTERNAL;
00000000  1  PROCEDURE SUBTRACT32 (OP1,OP2:INTEGER; VAR RESULT:INTEGER);EXTERNAL;
00000000  1  PROCEDURE MOVEBYTES  (SOURCE:PTR; SOURCE_OFFSET:INT; DEST:PTR; DEST_OFFSET:INT; COUNT:INT); EXTERNAL;
00000000  1  PROCEDURE INITGETSOURCE1;EXTERNAL;
00000000  1  $PAGE$
00000000  1  $GLOBPROC ON$
00000000  1  (***********************************************************************)
00000000  1  (********** INITIALIZE TRACE DATA **************************************)
00000000  1  (***********************************************************************)
00000000  1  PROCEDURE INIT_TRACEDATA;
00000004  2  BEGIN
00000004  2  INITGETSOURCE1;
0000000A  2  END;
00000000  1  $PAGE$
00000000  1  $GLOBPROC OFF$
00000000  1  (***********************************************************************)
00000000  1  (********** IN_STRUC ***************************************************)
00000000  1  (***********************************************************************)
00000000  1  (* See if current data byte is in current structure.                  *)
00000000  1  (***********************************************************************)
00000000  1  (* INPUTS:                                                             *)
```

```
00000000  1  (* RAW         Pointer to footdc data record.                       *)
00000000  1  (* DATA_ADDR   Address of data byte.                                *)
00000000  1  (* PRIMITIVE   Information about current STRUC.                     *)
00000000  1  (************************************************************************)
00000000  1  (* OUTPUTS:                                                          *)
00000000  1  (* IN_STRUC      TRUE  iff DATA_ADDR in current STRUC.               *)
00000000  1  (*               FALSE iff DATA_ADDR not in current STRUC.           *)
00000000  1  (************************************************************************)
00000000  1  FUNCTION IN_STRUC(DATA_ADDR:INTEGER; RAW:DATAREC_PTR; PRIMITIVE:PRIMITIVE_PTR):BOOLEAN;
00000001  2  VAR J:INT;
00000004  2  TEMP            :INTEGER;      (*TEMPORARY FOR TYPE CHANGING INTGERS*)
00000012  2  BEGIN WITH PRIMITIVE^ DO BEGIN
00000018  2  SUBTRACT32(DATA_ADDR,STRUC_ADDR,TEMP);
00000034  2  J:=TEMP[1];
0000003A  2  IN_STRUC:=FALSE;
0000003E  2  IF J>=0
00000046  2    THEN IF J<PRIMITIVE^.STRUC_SIZE
00000056  2      THEN IF PRIMITIVE^.USED[J]=BYTE(0)
00000062  2        THEN IN_STRUC:=TRUE;
00000068  2  END; END;
00000000  1  $PAGE$
00000000  1  $GLOBPROC OFF$
00000000  1  (************************************************************************)
00000000  1  (********* ADJACENT *****************************************************)
00000000  1  (************************************************************************)
00000000  1  (* Determin if the new data byte in the footdc is adjacent to the STRUC*)
00000000  1  (* that I am trying to byild.  If not prefetch processor then add a    *)
00000000  1  (* test to see if byte of data is from the same source line.          *)
00000000  1  (************************************************************************)
00000000  1  (* INPUTS:                                                           *)
00000000  1  (* PRIMITIVE   Ptr to information about current STRUC.               *)
00000000  1  (* DATA_ADDR   Address of data byte iff RAW^ is a data cycle.        *)
00000000  1  (* RAW         Pointer to footdc data record.                        *)
00000000  1  (* ERROR       Error flag from most recient fmgr read.               *)
00000000  1  (************************************************************************)
00000000  1  (* OUTPUTS:                                                          *)
00000000  1  (* ADJACENT    TRUE if data byte and part of currentr STRUC.         *)
00000000  1  (************************************************************************)
00000000  1  FUNCTION ADJACENT(PRIMITIVE:PRIMITIVE_PTR; DATA_ADDR:INTEGER; RAW:DATAREC_PTR;ERROR:INT):BOOLEAN;
00000076  2  BEGIN
00000076  2  ADJACENT:=FALSE;
0000007A  2  IF ERROR=0
00000082  2    THEN IF (RAW^.TYP=STATIC_) OR (RAW^.TYP=DYNAMIC_)
000000A8  2      THEN IF IN_STRUC(DATA_ADDR,RAW,PRIMITIVE)
000000C6  2        THEN ADJACENT:=TRUE;
000000CC  2  END;
00000000  1
00000000  1  $PAGE$
00000000  1  $GLOBPROC ON$
00000000  1  (************************************************************************)
00000000  1  (*********** TRACE DATAFLOW *********************************************)
00000000  1  (************************************************************************)
00000000  1  (* INPUTS:                                                           *)
00000000  1  (* REFLINE     Referencing line in BIGBUFF, with info for new line.   *)
00000000  1  (* DIRECTION   Direction to move in footdc data.                     *)
00000000  1  (************************************************************************)
00000000  1  (* OUTPUTS:                                                          *)
00000000  1  (* PRIMITIVE   Ptr to info needed to fmt display line.               *)
00000000  1  (* ERROR       0 = PRIMITIVE built as requested.                     *)
00000000  1  (************************************************************************)
00000000  1  PROCEDURE TRACEDATA(PRIMITIVE:PRIMITIVE_PTR; DIRECTION:INT; CURR:INT; VAR ERROR:INT);
00000000  2  LABEL 1;
00000000  2  VAR
00000000  2  ADJACENT_FLAG    :BOOLEAN;   (*TRUE if current reocrd is part of current primitive*)
00000001  2  DATA_BYTE        :BYTE;      (*Data byte from RAW^*)
00000002  2  DATA_ADDR        :INTEGER;   (*Physical address of DATA_BYTE*)
00000006  2  SYMBOL_NO        :INT;       (*Index into symbol table from RAW^*)
00000008  2  BYTE_INDEX       :INT;       (*Which byte in RAW^.BUSS_DATA*)
0000000A  2  J                :INT;       (*Index into structure being built*)
0000000C  2  SYMBOL           :SYMBOLPTR; (*Pointer to the symbol table symbol of intrest*)
00000010  2  P                :PTR;       (*This is the pointer that traverses the data base*)
00000014  2  TEMP             :INTEGER;   (*Temporary for storing results of 32 bit subtracts*)
000000DA  2
000000DA  2  BEGIN WITH PRIMITIVE^ DO BEGIN
```

```
000000E0  2  (********** PRIMING READ ******************************************************)
000000E0  2  IF DIRECTION=FWD
000000E8  2    THEN READFWD (RAW,DATA_BYTE,DATA_ADDR,BYTE_INDEX,SYMBOL_NO,CURR, ERROR)
00000116  2    ELSE READBKWD(RAW,DATA_BYTE,DATA_ADDR,BYTE_INDEX,SYMBOL_NO,CURR, ERROR);
00000140  2  IF ERROR<>0 THEN GOTO 1;                           (*IF FMGR ERROR THEN EXIT*)
0000014E  2  KC9A:=RAW^.KC9A;    (* SET TO ZERO IF THIS IS A MESSAGE *)
00000162  2  IF DIRECTION=FWD
0000016A  2    THEN ENDING  :=CURR
00000173  2    ELSE STARTING:=CURR;
00000182  2  $PAGE$
00000182  2  CASE RAW^.TYP OF
00000190  2  MESSAGE_:
00000190  2  (********** PROCESS MESSAGE RECORD *******************************************)
00000190  2  BEGIN (*Process message record*)
00000190  2  KC9A[0] := 0;
0000019A  2  KC9A[1] := 0;
000001A6  2  KC9A[2] := 0;
000001B2  2  KC9A[3] := 0;
000001BE  2  PRIMITIVE^.MESSAGE:=TRUE; (*Set special message flag*)
000001C8  2  PRIMITIVE^.SYM.LEN:=(RAW^.LEN-1)*2; (*Word count to byte count, dont count record type word*)
000001DE  2  MOVEBYTES(PTR(ADDR(RAW^.LEN)), 4, PTR(ADDR(PRIMITIVE^.SYM.LEN)), 2, SYM.LEN);
0000020E  2  END; (*Process message record*)
00000212  2  $PAGE$
00000212  2  ENTRY_,EXITT_:
00000212  2  (********** PROCESS ENTRY,EXIT RECORD *****************************************)
00000212  2  BEGIN (*ENTRY,EXIT*)
00000212  2  SYMBOL  :=ENVIRONMENT^.SYMBOL_TABLE[SYMBOL_NO];  (*Get pointer to correct symbol in symbol table*)
00000226  2  IF RAW^.TYP=ENTRY_
00000236  2    THEN STATUS:=ENTRYY
00000244  2    ELSE STATUS:=EXITT;
0000024E  2  IF STATUS=ENTRYY   (*Get source only for entryy*)
0000025E  2    THEN GETSOURCE1(RAW^.PC, PTR(ADDR(SYMBOL^.PATH.PROC_NAME)), SOURCELINE, SOURCELINE_NO, SOURCELINE_PATH,ERROR)
00000292  2    ELSE SOURCELINE.LEN:=0;  (*DONT DISPLAY SOURCE ON EXITS*)
0000029A  2  IF ERROR<>0 THEN GOTO 1; (*ERROR will = 0 even if source line not found unless the error is fatal*)
000002A8  2  FMTSYMBOL(PTR(ADDR(SYMBOL^.PATH.PROC_NAME)),PTR(ADDR(SYM.ASCII)),0,SYM.LEN);
000002CE  2  SYM_PATH:=SYMBOL^.PATH; (*Get symbol path*)
000002E2  2  SYM_PATH.PROC_NAME[0]:=0; (*Do not display procedure name, it is the same as the symbol field*)
000002EC  2  END;  (*ENTRY,EXIT*)
000002F0  2  $PAGE$
000002F0  2  STATIC_,DYNAMIC_:
000002F0  2  (********** PROCESS VARAIBLE RECORD ******************************************)
000002F0  2  BEGIN (*Process variable reocrds*)
000002F0  2  INDENT:=2;
000002FA  2  SYMBOL  :=ENVIRONMENT^.SYMBOL_TABLE[SYMBOL_NO];  (*Get pointer to correct symbol in symbol table*)
0000030E  2  P       :=PTR(ADDR(SYMBOL^.DATABASE));            (*Initialize P to point to start of data base*)
0000031A  2  (*This is normaly where I would get r/w status  but it is not needed for trace dataflow*)
0000031A  2  (*This is normaly where I would get source line but it is not needed for trace dataflow*)
0000031A  2  CASE RAW^.TYP OF (*Find absolute address of structure*)
00000328  2    STATIC_  :STRUC_ADDR:=SYMBOL^.DATABASE.ADDRESS; (*GET STRUC ADDR FROM DATA BASE*)
0000033A  2    DYNAMIC_ :ADD32(SYMBOL^.DATABASE.ADDRESS,RAW^.STACK,STRUC_ADDR);    (*STRUC ADDR:=VARIABLE'S STACK OFFSET + STACK
00000362  2    OTHERWISE;
00000362  2    END;
00000386  2  FMTSYM(SYM,P,DATA_ADDR,SYMBOL^.LANGUAGE,STRUC_ADDR,BYTE_INDEX,STRUC_SIZE,PAD,RAW);
000003BE  2  FOR J:=0 TO STRUC_SIZE-1 DO BEGIN STRUC[J]:=0; USED[J]:=BYTE(FALSE); END;
0000040A  2  SYM_PATH:=SYMBOL^.PATH; (*Get symbol path*)
0000041E  2
0000041E  2  (*Adjacecy loop*)
0000041E  2  ADJACENT_FLAG:=TRUE; (*FORCE FIRST ITERATION THROUGH LOOP*)
00000424  2  WHILE ADJACENT_FLAG DO
0000042C  2    BEGIN  (*Adjacency loop*)
0000042C  2    SUBTRACT32(DATA_ADDR,PRIMITIVE^.STRUC_ADDR,TEMP); (*FIND INDEX INTO STRUC & USED ARRAY*)
00000448  2    J:=TEMP[1];                              (*LOOK AT LS 16 BITS*)
0000044E  2    STRUC[J]:=DATA_BYTE; (*MOVE ONE BYTE*)
00000460  2    USED[J]:=BYTE(TRUE);              (*MARK THE BYTE AS USED*)
00000472  2    COUNTER:=COUNTER+1;               (*INC USED COUNT*)
00000480  2    IF DIRECTION=FWD
00000488  2      THEN ENDING:=CURR
00000496  2      ELSE
00000496  2      BEGIN
00000496  2      STARTING:=CURR;
000004A0  2      KC9A:=RAW^.KC9A;
000004B4  2      END;
000004B4  2    IF DIRECTION=FWD
000004BC  2      THEN READFWD (RAW,DATA_BYTE,DATA_ADDR,BYTE_INDEX,SYMBOL_NO,CURR,ERROR)  (*ERROR is checked by ADJACENT*)
```

```
000004EA  2      ELSE READBKWD(RAW,DATA_BYTE,DATA_ADDR,BYTE_INDEX,SYMBOL_NO,CURR,ERROR); (*ERROR is checked by ADJACENT*)
00000514  2     ADJACENT_FLAG:=ADJACENT(PRIMITIVE,DATA_ADDR,RAW,ERROR)
00000536  2     END;   (*Adjacency loop*)
0000053A  2  IF ERROR=EOF THEN ERROR:=0;
0000054E  2  IF ERROR=0 THEN FMTVAL(VAL,P,STRUC,USED,COUNTER,PAD);  (*FORMAT THE VALUE STRING*)
00000590  2  END;  (*Process variable reocrds*)
00000584  2  OTHERWISE;
00000584  2  END; (*END CASE*)
000005BC  2  1:END;END;. (*END WITH PRIMITIVE*) (*END PROCEDURE TRACEDAT*)

End of compilation, number of errors=    0

00000000  1  "68000" PREPROCESS
00000000  1  #DEFINE M68000 TRUE
00000000  1  (************************************************************************************)
00000000  1  (**********  TRACE STATEMENTS  ******************************************************)
00000000  1  (************************************************************************************)
00000000  1  PROGRAM PTRACESTM;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1  $FAR$
00000000  1  $EXTVAR ON$
00000000  1  VAR
00000000  1  ENVIRONMENT:ENVIRONMENT_PTR;
00000000  1  ZERO:INTEGER;
00000000  1  ONE :INTEGER;
00000000  1  $EXTVAR OFF$
00000000  1
00000000  1
00000000  1
00000000  1  (************************************************************************************)
00000000  1  (**********  STRUCTURES  ************************************************************)
00000000  1  (************************************************************************************)
00000000  1  (* The following structures are allocated from the buffer pool.                     *)
00000000  1  (*                                                                                  *)
00000000  1  (* FRAME_ARRAY          Ptr to fixed size array of addresses of parameters and local variables  *)
00000000  1  (*                      for each procedure.  These are a function of the current frame record   *)
00000000  1  (*                      (stack addresses) and stack relative addresses from the data base       *)
00000000  1  (*                                                                                  *)
00000000  1  (* REF_ARRAY            Ptr to fixed size array of addresses of variables that are objects of   *)
00000000  1  (*                      reference parameters.                                      *)
00000000  1  (*                                                                                  *)
00000000  1  (* UNKNOWN_ARRAY        Ptr to fixed size array of addresses that have been encountered but     *)
00000000  1  (*                      have no data base information, avoiding wasting time looking for info   *)
00000000  1  (*                                                                                  *)
00000000  1  (* REMEMBR_ARRAY        Ptr to fixed size array for remembering data base information.          *)
00000000  1  (*                      To avoid spending the time to call Tom for information each time.       *)
00000000  1  (************************************************************************************)
00000000  1
00000000  1
00000000  1
00000000  1  (*********************************************************************)
00000000  1  (******** CONSTANTS **************************************************)
00000000  1  (*********************************************************************)
00000000  1  CONST
00000000  1  MAX_SEG                =7;            (*MAX INDEX FOR SEG_ARRAY*)
00000000  1  MAX_REF_COUNT          =32;           (*MAX # OF REFERENCES IN REF_ARRAY*)
00000000  1  MAX_PROC_COUNT         =14;           (*MAX # OF PROCS    IN FRAME_ARRAY   *)
00000000  1  MAX_UNKNOWN_COUNT      =100;          (*MAX # OF UNKNOWNS IN UNKNOWN ARRAY*)
00000000  1  FIXEDSIZE              =5;            (*    # OF WORDS    IN FIXED SIZE INFO OF NODE IN REMEMBR_ARRAY*)
00000000  1  REMEMBRSIZE            =MAX_DBSIZE+FIXEDSIZE;(*   # OF WORDS IN FIXED SIZE REMEMBR ARRAY*)
00000000  1  CODE                   =0A000H;       (*Error code for status line*)
00000000  1  STATIC_ADDR            =0;
00000000  1  DYNAMIC_ADDR           =1;
00000000  1  $PAGE$
00000000  1  (*********************************************************************)
00000000  1  (******** LOCAL TYPES ************************************************)
00000000  1  (*********************************************************************)
00000000  1  TYPE
00000000  1  NODE_PTR               =^NODE_TYPE;
00000000  1  NODE_TYPE              =RECORD
```

BEST AVAILABLE COPY

```
00000000 2    DUMMY           :INT;            (*DUMMY TO AVOID LEGAL RANGE ERRORS ON DPC COMPILES*)
00000000 2    NODESIZE        :INT;            (*NUMBER OF WORDS IN ENTIRE NODE*)
00000000 2    PROC_NO         :INT;            (*PROC NUMBER, 0==> STATIC *)
00000000 2    MAX             :INTEGER;        (*MAX STRUC ADR:STATIC==>ABS, DYNAMIC==>STACK-REL, REF==>STACK-REL ADR OF A
00000000 2    DATABASE        :DATABASE_TYPE   (*DATA BASE INFORMATION FROM TOM'S DATA BASE*)
00000000 1    END;
00000000 1
00000000 1  FRAME_ARRAY_PTR     =^FRAME_ARRAY_TYPE;
00000000 1  FRAME_ARRAY_TYPE    =ARRAY[1..MAX_PROC_COUNT] OF RECORD
00000000 2    PARAM_ABS_MIN     :INTEGER;
00000000 2    PARAM_ABS_MAX     :INTEGER;
00000000 2    VAR_ABS_MIN       :INTEGER;
00000000 2    VAR_ABS_MAX       :INTEGER;
00000000 2    PARAM_REL_MIN     :INTEGER;    (*OFFSET TO PARAMETERS FROM STACK_POINTER*)
00000000 2    PARAM_REL_MAX     :INTEGER;    (*OFFSET TO PARAMETERS FROM STACK_POINTER*)
00000000 2    VAR_REL_MIN       :INTEGER;    (*OFFSET TO VARIABLES  FROM STACK_POINTER*)
00000000 2    VAR_REL_MAX       :INTEGER;    (*OFFSET TO VARIABLES  FROM STACK_POINTER*)
00000000 2    RECURSION         :BOOLEAN;    (*FALSE==> IGNORE VARIABLES FIELD*)
00000000 2    DUMMY             :BOOLEAN;    (*PAD BYTE*)
00000000 2    STACK             :INTEGER;    (*STACK_POINTER FROM CURRENT FRAME RECORD*)
00000000 2    PROC_NO           :INT;        (*PROCEDURE NUMBER*)
00000000 1    END;
00000000 1
00000000 1  REF_ARRAY_PTR       =^REF_ARRAY_TYPE;
00000000 1  REF_ARRAY_TYPE      =ARRAY[1..MAX_REF_COUNT] OF RECORD
00000000 2    OBJECT_MIN .      :INTEGER;    (*PHYSICAL ADDRESS OF STRUCTURE THAT IS OBJECT OF REF*)
00000000 2    OBJECT_MAX        :INTEGER;    (*PHYSICAL ADDRESS OF STRUCTURE THAT IS OBJECT OF REF*)
00000000 2    ADDR_OF_REF       :INTEGER;    (*ADDR OF REF RELATIVE TO STACK*)
00000000 2    PROC_NO           :INT;
00000000 1    END;
00000000 1
00000000 1  REMEMBR_ARRAY_PTR   =^REMEMBR_ARRAY_TYPE;
00000000 1  REMEMBR_ARRAY_TYPE  =ARRAY[0..REMEMBERSIZE-1] OF INT;
00000000 1
00000000 1  UNKNOWN_ARRAY_PTR   =^UNKNOWN_ARRAY_TYPE;
00000000 1  UNKNOWN_ARRAY_TYPE  =ARRAY [1..MAX_UNKNOWN_COUNT] OF INTEGER;
00000000 1  SEG_ARRAY           =ARRAY[0..MAX_SEG] OF INTEGER;
00000000 1  RESULT_TYPE         =(FOUND,NOTFOUND,REF,PRG,FRAME);
00000000 1  #IF M68000
00000000 1  GENERIC_INT         =SIGNED_32;
00000000 1  #ELSE
00000000 1  GENERIC_INT         =INT;
00000000 1  #ENDIF
00000000 1  $PAGE$
00000000 1  (**********************************************************************)
00000000 1  (******** LOCAL VARIABLES *********************************************)
00000000 1  (**********************************************************************)
00000000 1  VAR
00000000 1  SEG               :SEG_ARRAY;             (*SEGMENT REGISTERS VALUES FOR CURRENT FRAME RECORD*)
00000020 1  FRAME_ARRAY       :FRAME_ARRAY_PTR;       (*PTR TO FIXED SIZE PROC    ARRAY*)
00000024 1  REF_ARRAY         :REF_ARRAY_PTR;         (*PTR TO FIXED SIZE REF  ARRAY*)
00000028 1  UNKNOWN_ARRAY     :UNKNOWN_ARRAY_PTR;     (*PTR TO FIXED SIZE UNKNOWN  ARRAY*)
0000002C 1  REMEMBR_ARRAY     :REMEMBR_ARRAY_PTR;     (*PTR TO FIXED SIZE REMEMBR ARRAY*)
00000030 1  REMEMBR_OVFLW     :BOOLEAN;               (*FLAG SET IF REMEMBR_ARRAY GETS CLEARED*)
00000032 1  OLD_DATAODR       :INTEGER;               (*SAVE THIS IN CASE REMEMBR_ARRAY GETS CLEARED *)
00000036 1  OLD_OFFSET        :GENERIC_INT;           (*SAVE THIS IN CASE REMEMBR_ARRAY GETS CLEARED *)
0000003A 1  PROC_COUNT        :INT;                   (*# OF PROCS   IN FRAME   ARRAY*)
0000003C 1  UNKNOWN_COUNT     :INT;                   (*# OF UNKNOWNS IN UNKNOWN ARRAY*)
0000003E 1  LAST_UNKNOWN      :INT;                   (*INDEX TO THE LAST (MOST RECENT) UNKNOWN ADDED TO UNKNOWN ARRAY*)
00000040 1  FREE              :INT;                   (*INDEX TO NEXT FREE WORD IN REMEMBR ARRAY*)
00000042 1  FRAME_REC         :INT;                   (*FNGR RECORD NUMBER OF CURRENT FRAME   RECORD*)
00000044 1  REF_COUNT         :INT;                   (*# OF REFS IN REF ARRAY*)
00000046 1  REF_STRUC_ADDR    :INTEGER;               (*ADDRESS OF THE CURRENT REFERENCE BEING BUILT*)
0000004A 1  REF_STRUC         :STRUC_TYPE;            (*STRUCTURE FOR BUILDING CURRENT REFERENCES*)
0000006A 1  REF_STRUC_SIZE    :INT;                   (*# OF BYTES IN CURRENT REF_STRUC*)
0000006C 1  REF_BYTE_COUNT    :INT;                   (*# OF BYTES USED SO FAR IN BUILDING CURRENT REFERENCE*)
0000006E 1  REF_USED          :STRUC_TYPE;            (*MAINTAIN RECORD OF WHAT BYTES ARE USED IN CURRENT REF_STRUC*)
0000008E 1  SOURCEFILE_NO     :INT;                   (*SOURCE FILE NUMBER FOR ALL DATA BASE CALLS*)
00000090 1  RAW               :DATAREC_PTR;           (*PTR TO FOOTDC RECORD*)
00000094 1  FRONTIER_REC      :INT;                   (*1ST FNGR REC IN FRAME THAT HAS NOT BEEN PROCESSED OR FULLY PROCESSE
00000096 1  P                 :PTR;                   (*This is the pointer that traverses the data base*)
0000009A 1  PROC_NO           :INT;                   (*Proc # of proc being traced, 0==> main program*)
0000009C 1                                            (*USED TO DETERMINE IF WE MUST SCAN FOR READ OF REF PTRS FROM STACK*)
0000009C 1  $EXTVAR ON$
```

```
0000009C  1  E100                    :STRNG;
0000009C  1  E003                    :STRNG;
0000009C  1  E004                    :STRNG;
0000009C  1  E005                    :STRNG;
0000009C  1  $EXTVAR OFF$
0000009C  1  $PAGE$
00000000  1  (*******************************************************************)
00000000  1  (********** PROCEDURES *********************************************)
00000000  1  (*******************************************************************)
00000000  1  FUNCTION GE                  (OP1,OP2:INTEGER):BOOLEAN; EXTERNAL;
00000000  1  FUNCTION LE                  (OP1,OP2:INTEGER):BOOLEAN; EXTERNAL;
00000000  1  FUNCTION GT                  (OP1,OP2:INTEGER):BOOLEAN; EXTERNAL;
00000000  1  FUNCTION LT                  (OP1,OP2:INTEGER):BOOLEAN; EXTERNAL;
00000000  1  FUNCTION NE                  (OP1,OP2:INTEGER):BOOLEAN; EXTERNAL;
00000000  1
00000000  1  #IF M68000
00000000  1  PROCEDURE OUTIT          (LETTER:CHAR;VALUE:INT;BASE:CHAR); EXTERNAL;
00000000  1  FUNCTION EQ                  (OP1,OP2:INTEGER):BOOLEAN; EXTERNAL;
00000000  1  #ENDIF
00000000  1  PROCEDURE INITGETSOURCE2     ;EXTERNAL;
00000000  1  PROCEDURE FIX_INTEL_DATA     (VAR STRUC,USED:STRUC_TYPE; STRUC_SIZE:INT); EXTERNAL;
00000000  1  PROCEDURE STATUS_LINE        (P:STRNG_PTR;CODE:INT;POSITION:INT); EXTERNAL;
00000000  1  PROCEDURE FMT_PC             (PC:INTEGER;VAR S:STRNG); EXTERNAL;
00000000  1  PROCEDURE MOVEBYTES          (SOURCE:PTR; SOURCE_OFFSET:INT; DEST:PTR; DEST_OFFSET2:INT; COUNT:INT); EXTERNAL;
00000000  1  PROCEDURE FMTFILE            (SOURCE,DEST:PTR; DEST_OFFSET:INT; VAR LEN:INT);EXTERNAL;
00000000  1  PROCEDURE PUTCHAR            (DEST:PTR; DEST_OFFSET:INT; CHARACTER:CHAR); EXTERNAL;
00000000  1  PROCEDURE EXTEND             (OP1:INT; VAR RESULT:INTEGER);EXTERNAL;
00000000  1  PROCEDURE ADD32              (OP1,OP2:INTEGER; VAR RESULT:INTEGER);EXTERNAL;
00000000  1  PROCEDURE SUBTRACT32         (OP1,OP2:INTEGER; VAR RESULT:INTEGER);EXTERNAL;
00000000  1  PROCEDURE MULTIPLY32         (OP1,OP2:INTEGER; VAR RESULT:INTEGER);EXTERNAL;
00000000  1  PROCEDURE DIVIDE32           (OP1,OP2:INTEGER; VAR RESULT:INTEGER);EXTERNAL;
00000000  1  PROCEDURE LOGICAL_TO_PHYS    (INPUT:INTEGER; VAR OUTPUT:INTEGER);EXTERNAL;
00000000  1  PROCEDURE NEW_IT             (SIZE:INT; VAR P:PTR); EXTERNAL;
00000000  1  PROCEDURE DISPOSE_IT         (SIZE:INT; VAR P:PTR); EXTERNAL;
00000000  1  PROCEDURE STATIC_VAR         (SOURCEFILE_NO:INT; VAR SUB_NO:INT; ABS_NAME:PTR; ABS_DISC:INT; VAR BUSS_ADDR:INTEGER;
00000000  2                               DB:PTR; VAR COUNT:INT; VAR ERROR:INT); EXTERNAL;
00000000  1  PROCEDURE DYNA_VAR           (SOURCEFILE_NO, SUB_NO:INT; OFFSET:INT;SYMBOL:PTR; V_TYP:BYTE;
00000000  2                               VAR COUNT, ERROR:INT);EXTERNAL;
00000000  1  PROCEDURE PROC_STACK         (SOURCEFILE_NO, SUB_NO:INT; VAR RECURSION:BOOLEAN;
00000000  2                               VAR PARM_MIN,PARM_MAX,VAR_MIN,VAR_MAX,ERROR:INT); EXTERNAL;
00000000  1  PROCEDURE PROG_INIT          (SOURCE_NAME:PTR; VAR SOURCE_DISC:INT;
00000000  2                               VAR SOURCE_NO,PROCESSOR,LANGUAGE,ERROR:INT); EXTERNAL;
00000000  1  PROCEDURE SUB_NAME           (SOURCE_NO,SUB_NO:INT; SUB_NAME:PTR; VAR ERROR:INT); EXTERNAL;
00000000  1  PROCEDURE FMTSYM             (VAR SYM:STRNG; VAR P:PTR; BUSS_ADDR:INTEGER; LANGUAGE:INT; VAR STRUC_ADDR:INTEGER;
00000000  2                               BYTE_INDEX:INT; VAR STRUC_SIZE:INT; VAR PAD:BOOLEAN; RAW:DATAREC_PTR);  EXTERNAL;
00000000  1  PROCEDURE FMTVAL             (VAR VAL:STRNG; VAR P:PTR; VAR STRUC:STRUC_TYPE;
00000000  2                               VAR USED:STRUC_TYPE; COUNTER:INT; PAD:BOOLEAN);  EXTERNAL;
00000000  1  PROCEDURE READFWD            (VAR RAW:DATAREC_PTR; VAR DATA_BYTE:BYTE; VAR DATA_ADDR:INTEGER;
00000000  2                               VAR BYTE_INDEX, SYMBOL_NO:INT; VAR LOC:INT; VAR ERROR:INT); EXTERNAL;
00000000  1  PROCEDURE READBKWD           (VAR RAW:DATAREC_PTR; VAR DATA_BYTE:BYTE; VAR DATA_ADDR:INTEGER;
00000000  2                               VAR BYTE_INDEX, SYMBOL_NO:INT; VAR LOC:INT; VAR ERROR:INT); EXTERNAL;
00000000  1  PROCEDURE GETSOURCE2         (REQ_PC:INTEGER; VAR SOURCELINE:STRNG; VAR SOURCELINE_NO:INT;
00000000  2                               VAR SOURCELINE_PATH:PATH_TYPE; VAR MIN,MAX:INTEGER; VAR ERROR:INT); EXTERNAL;
00000000  1  PROCEDURE FMT_FILENOTFOUND (VAR FILENAME:FNCRNAME; DISC:INT; VAR S:STRNG); EXTERNAL;
00000000  1  FUNCTION  MAXX               (A,B:INT):INT;BEGIN IF A>B THEN MAXX:=A ELSE MAXX:=B; END;
00000000  1  #IF M68000
00000000  1  $PAGE$
00000000  1  $GLOBPROC OFF$
00000000  1  (*******************************************************************)
00000000  1  (********** GO_READFWD *********************************************)
00000000  1  (*******************************************************************)
00000000  1  (*    This is only used for SODA to avoid capturing any information      *)
00000000  1  (* which is neither program or data. This came up with the 186 having  *)
00000000  1  (* records which act as neither and should be ignored. This should not *)
00000000  1  (* occur in the 68000. This particular case is handled successfully in *)
00000000  1  (* SPIDER as a data record.                                             *)
00000000  1  (*******************************************************************)
00000000  1  PROCEDURE GO_READFWD  (VAR RAW:DATAREC_PTR; VAR DATA_BYTE:BYTE; VAR DATA_ADDR:INTEGER;
00000000  2                         VAR BYTE_INDEX, SYMBOL_NO:INT; VAR LOC:INT; VAR ERROR:INT);
00000000  2  LABEL 1;
00000000  2  VAR
00000000  2   FOUND : BOOLEAN;  (* Used to indicate if program or data record has been found *)
0000002C  2
0000002C  2  BEGIN
```

```
0000002C  2   FOUND := FALSE;
00000030  2   WHILE NOT FOUND DO BEGIN
00000038  2    READFWD (RAW,DATA_BYTE,DATA_ADDR,BYTE_INDEX,SYMBOL_NO,LOC,ERROR);
0000006E  2    IF ERROR <> 0 THEN GOTO 1;
0000007C  2    FOUND := TRUE;
00000082  2    IF RAW^.TYP=STATEMENTS_ THEN
00000094  2      IF NOT(RAW^.PROG_STATUS) AND NOT(RAW^.DATA_STATUS) THEN FOUND := FALSE;
000000BA  2   END;  (* WHILE *)
000000BE  2  1:END;  (* PROCEDURE GO_READFWD *)
00000000  1  $PAGE$
00000000  1  $GLOBPROC OFF$
00000000  1  (************************************************************************)
00000000  1  (********** GO_READBKWD *************************************************)
00000000  1  (************************************************************************)
00000000  1  (*    This is only used for SODA to avoid capturing any information     *)
00000000  1  (* which is neither program or data. This came up with the 186 having   *)
00000000  1  (* records which act as neither and should be ignored. This should not *)
00000000  1  (* occur in the 68000. This particular case is handled successfully in *)
00000000  1  (* SPIDER as a data record.                                             *)
00000000  1  (************************************************************************)
00000000  1  PROCEDURE GO_READBKWD  (VAR RAW:DATAREC_PTR; VAR DATA_BYTE:BYTE; VAR DATA_ADDR:INTEGER;
00000000  2                          VAR BYTE_INDEX, SYMBOL_NO:INT; VAR LOC:INT; VAR ERROR:INT);
00000000  2  LABEL 1;
00000000  2  VAR
00000000  2   FOUND : BOOLEAN;  (* Used to indicate if program or data record has been found *)
000000C6  2
000000C6  2  BEGIN
000000C6  2   FOUND := FALSE;
000000CA  2   WHILE NOT FOUND DO BEGIN
000000D2  2    READBKWD (RAW,DATA_BYTE,DATA_ADDR,BYTE_INDEX,SYMBOL_NO,LOC,ERROR);
00000108  2    IF ERROR <> 0 THEN GOTO 1;
00000116  2    FOUND := TRUE;
0000011C  2    IF RAW^.TYP=STATEMENTS_ THEN
0000012E  2      IF NOT(RAW^.PROG_STATUS) AND NOT(RAW^.DATA_STATUS) THEN FOUND := FALSE;
00000154  2   END;  (* WHILE *)
00000158  2  1:END;  (* PROCEDURE GO_READBKWD *)
00000000  1
00000000  1  #ENDIF
00000000  1  $PAGE$
00000000  1  $GLOBPROC OFF$
00000000  1  (************************************************************************)
00000000  1  (********** BUILD_REF * *************************************************)
00000000  1  (************************************************************************)
00000000  1  (* Construct a reference (pointer) to the object of a reference param  *)
00000000  1  (************************************************************************)
00000000  1  (* INPUTS (parameters):                                                 *)
00000000  1  (* DATA_BYTE   Data byte that is part of a reference.                   *)
00000000  1  (* DATA_ADDR   Address of DATA_BYTE.                                    *)
00000000  1  (* FOO         Pointer to node containing data base info for reference *)
00000000  1  (* STRUC_ADDR  Abs address of the reference containing DATA_BYTE.       *)
00000000  1  (*                                                                     *)
00000000  1  (* INPUTS (static variables):                                          *)
00000000  1  (* REF_STRUC_ADDR  Abs address of the current refrence being built.    *)
00000000  1  (* REF_STRUC       Structure for building current references.          *)
00000000  1  (*                 (unpacked iff BPC).                                 *)
00000000  1  (* REF_STRUC_SIZE  # of bytes in current REF_STRUC.                    *)
00000000  1  (* REF_BYTE_COUNT  # of bytes used so far in building current reference*)
00000000  1  (* REF_USED        Maintain record of bytes used in current REF_STRUC  *)
00000000  1  (************************************************************************)
00000000  1  (* Outputs (static variables):                                         *)
00000000  1  (* REF_STRUC_ADDR  Abs address of the current reference being built.   *)
00000000  1  (* REF_STRUC       Structure for building current references.          *)
00000000  1  (* REF_STRUC_SIZE  # of bytes in current REF_STRUC.                    *)
00000000  1  (* REF_BYTE_COUNT  # of bytes used so far in building current reference*)
00000000  1  (* REF_USED        Maintain record of bytes used in current REF_STRUC  *)
00000000  1  (* REF_ARRAY       Array of all references currently known.            *)
00000000  1  (************************************************************************)
00000000  1  PROCEDURE BUILD_REF(DATA_ADDR:INTEGER; DATA_BYTE:BYTE;  FOO:NODE_PTR; STRUC_ADDR:INTEGER);
00000000  2  VAR
00000000  2  TEMP      :INTEGER;     (*Temporary for type changing INTEGERs*)
00000004  2  I         :INT;         (*Index to REF_ARRAY*)
00000006  2  J         :INT;         (*Index into REF_STRUC being constructed*)
00000160  2  BEGIN
00000160  2  (********** IS IT PART OF THE REF THAT IS UNDER CONSTRUCTION?************)
```

```
00000160  2  IF  (REF_BYTE_COUNT=0) OR (STRUC_ADDR<>REF_STRUC_ADDR) THEN
0000017E  2    BEGIN (*IT IS A NEW REF, THROW OUT ANY OLD STUFF*)
0000017E  2    REF_STRUC_SIZE:=FOO^.DATABASE.SIZE[1];  (*GET SIZE OF THE REFERENCE, 2 OR 4 BYTES*)
0000018C  2    REF_STRUC_ADDR:=STRUC_ADDR;
00000190  2    FOR I:=0 TO REF_STRUC_SIZE-1 DO REF_USED[I]:=0; (*0=FALSE*)
000001C4  2    REF_BYTE_COUNT:=0; (*Clear count of # of bytes found in current structure*)
000001C8  2    END;  (*IT IS A NEW REF, THROW OUT ANY OLD STUFF*)
000001C8  2
000001C8  2  (********** CONSTRUCT THE CURRENT PIECE OF THE CURRENT REF **************)
000001C8  2  SUBTRACT32(DATA_ADDR,REF_STRUC_ADDR,TEMP);   (*J:=DATA_ADDR-REF_STRUC_ADDR;*)
000001E0  2  J:=TEMP[1];
000001E6  2  REF_STRUC[J]:=DATA_BYTE;
000001F4  2  IF REF_USED[J]=0 THEN  (*0=FALSE*)
00000204  2    BEGIN
00000204  2    REF_USED[J]:=1;      (*1=TRUE*)
0000020E  2    REF_BYTE_COUNT:=REF_BYTE_COUNT+1;
00000212  2    END;
00000212  2
00000212  2  (********** IF THE CURRENT REFERENCE IS COMPLETE AND NOT ALREADY IN REF_ARRAY THEN ADD IT*****)
00000212  2  IF REF_BYTE_COUNT=REF_STRUC_SIZE THEN
0000021E  2    BEGIN (*REF_STRUC is complete. It is unpacked iff bpc*)
0000021E  2    IF ENVIRONMENT^.INTEL THEN FIX_INTEL_DATA(REF_STRUC,REF_USED,REF_STRUC_SIZE); (*Put ms addr byte first*)
00000244  2    TEMP[0]:=0; (*clear ms word of temp in case ref_struc_size = 2 bytes*)
00000248  2    FOR I:=0 TO REF_STRUC_SIZE-1 DO  (*Move ref_struc to temp, packing iff bpc*)
0000025E  2      PUTCHAR(PTR(ADDR(TEMP)), 4-REF_STRUC_SIZE+I, CHAR(REF_STRUC[I]));
0000029A  2    IF ENVIRONMENT^.INTEL THEN
000002A8  2     IF REF_STRUC_SIZE=2 THEN TEMP[0]:=SEG[2,0];(* LSW OF SEG_REG 2 *)
000002BE  2    LOGICAL_TO_PHYSICAL(TEMP,TEMP); (*CONVERT TO PHYSICAL ADDRESS FOR GRAVY SUCKING PIG 8086*)
000002CE  2    (*TEMP NOW CONTAINS PHYSICAL ADDRESS OF THE OBJECT OF THE REFERENCE*)
000002CE  2    I:=1;
000002D4  2    WHILE (REF_ARRAY^[I].OBJECT_MIN <> TEMP) AND (I<=REF_COUNT) DO I:=I+1; (*See if its already in the array*)
0000030A  2    IF I>REF_COUNT THEN
00000316  2      BEGIN (*ADD COMPLETED REF (STRUC) TO REF ARRAY*)
00000316  2      REF_COUNT:=REF_COUNT+1;
0000031A  2      WITH REF_ARRAY^[REF_COUNT] DO
00000330  2        BEGIN (*WITH*)
00000330  2        OBJECT_MIN:=TEMP;                  (*MIN = ADDR(OBJECT OF REF) i.e. THE CONTENTS OF REF ITSELF*)
00000334  2        I:=SHIFT(FOO^.DATABASE.WORD1,-8)+1;  (*INDEX TO SIZE OF OBJECT OF REF*)
00000344  2        TEMP[1]:=FOO^.DATABASE.GENERIC[I];   (*GET SIZE OF OBJECT OF REF*)
00000350  2        TEMP[0]:=0;                          (*MS BYTE OF SIZE:=0*)
00000354  2        ADD32(TEMP, OBJECT_MIN, OBJECT_MAX);  (*MAX <-- address of first byte past object of ref*)
0000036E  2        TEMP[0]:=0FFFFH;
00000374  2        TEMP[1]:=0FFFFH;
0000037A  2        ADD32(TEMP,OBJECT_MAX,OBJECT_MAX);     (*MAX <-- address of last byte in object of ref*)
00000396  2        ADDR_OF_REF:=FOO^.DATABASE.ADDRESS;
000003A4  2        PROC_NO:=FOO^.PROC_NO;
000003B2  2        END; (*WITH*)
000003B2  2      END;  (*ADD COMPLETED REF (STRUC) TO REF ARRAY*)
000003B2  2    REF_BYTE_COUNT:=0; (*Clear count of # of bytes found in current structure*)
000003B6  2    END;  (*THE REF_STRUC IS COMPLETE*)
000003B6  2  END;
00000000  1  $PAGE$
00000000  1  $GLOBPROC OFF$
00000000  1  (*************************************************************************)
00000000  1  (********** BUILD_UNKNOWN ************************************************)
00000000  1  (*************************************************************************)
00000000  1  (* ADD UNKNOWN ADDRESS TO CIRCULAR BUFFER OF THE LAST N UNKNOWNS        *)
00000000  1  (*************************************************************************)
00000000  1  (* INPUTS:                                                               *)
00000000  1  (* DATA_ADDR         Address that data base knows nothing about.         *)
00000000  1  (* LAST_UNKNOWN      Index to the last (most recient) unknown added      *)
00000000  1  (* MAX_UNKNOWN COUNT Maximum index into UNKNOWN_ARRAY.                   *)
00000000  1  (*************************************************************************)
00000000  1  PROCEDURE BUILD_UNKNOWN(DATA_ADDR:INTEGER);
000003BE  2  BEGIN
000003BE  2  IF LAST_UNKNOWN=MAX_UNKNOWN_COUNT
000003CA  2    THEN LAST_UNKNOWN:=1                (*INC BY WRAPPING*)
000003D4  2    ELSE LAST_UNKNOWN:=LAST_UNKNOWN+1;    (*INC BY ADDING 1*)
000003D8  2  UNKNOWN_ARRAY^[LAST_UNKNOWN]:=DATA_ADDR; (*SAVE THE DATA_ADDRESS IN UNKNOWN ARRAY*)
000003EA  2  IF UNKNOWN_COUNT<>MAX_UNKNOWN_COUNT THEN UNKNOWN_COUNT:=UNKNOWN_COUNT+1;  (*INC TOTAL # OF UNKNOWNS*)
000003FA  2  END;
00000000  1  $PAGE$
00000000  1  $GLOBPROC ON$
00000000  1  (*************************************************************************)
```

```
00000000 1 (*********** INIT_TRACESTM ****************************************************)
00000000 1 (*******************************************************************************)
00000000 1 (* INPUTS:                                                                     *)
00000000 1 (* FILE_NO     SOURCE FILE NUMBER FOR ALL DATA BASE CALLS IN TRACESTMS *)
00000000 1 (*******************************************************************************)
00000000 1 (* OUTPUTS:                                                                    *)
00000000 1 (* ERROR         NOT_FOUND (Proc not found in call to PROC_STACK)         *)
00000000 1 (*               PROG_NOT_FOUND (No data base for requested file)         *)
00000000 1 (*               Codes >=20 ==> fatal error displayed by data base        *)
00000000 1 (*******************************************************************************)
00000000 1 PROCEDURE INIT_TRACESTM(VAR ERROR:INT);
00000000 2 LABEL 1;
00000000 2 CONST
00000000 2 CODE=0A000H; (*Error code for output int to pisces status line*)
00000000 2 VAR
00000000 2 I               :INT;      (*LOOP COUNTER*)
00000002 2 REC_NO          :INT;      (*RECORD NUMBER OF FIRST DATA RECORD*)
00000004 2 DATA_BYTE       :BYTE;     (*DUMMY PARAMETER*)
00000005 2 DATA_ADDR       :INTEGER;  (*DUMMY PARAMETER*)
0000000A 2 BYTE_INDEX      :INT;      (*DUMMY PARAMETER*)
0000000C 2 SYMBOL_NO       :INT;      (*DUMMY PARAMETER*)
0000000E 2 POSITION        :INT;
00000010 2 LENGTH          :INT;       (*Length of file name in error message*)
00000012 2 DEST            :STRNG_PTR; (*Temporary string for error message*)
00000016 2 MORE            :BOOLEAN;   (*True if still looking for 1st not message record*)
00000402 2
00000402 2 BEGIN
00000402 2 NEW(FRAME_ARRAY);         (*ALLOCATE FIXED SIZE PROC     ARRAY*)
00000414 2 NEW(REF_ARRAY);           (*ALLOCATE FIXED SIZE REF      ARRAY*)
00000426 2 NEW(UNKNOWN_ARRAY);       (*ALLOCATE FIXED SIZE UNKNOWN  ARRAY*)
00000438 2 NEW(REMEMBER_ARRAY);      (*ALLOCATE FIXED SIZE REMEMBER  ARRAY*)
0000044A 2 INITGETSOURCE2;
00000450 2
00000450 2 PROC_COUNT    :=0;        (*NO OF PROCS    IN FRAME_ARRAY*)
00000454 2 REF_COUNT     :=0;        (*NO OF REFS     IN REF ARRAY*)
00000458 2 UNKNOWN_COUNT :=0;        (*NO OF UNKNOWNS IN UNKNOWN_ARRAY*)
0000045C 2 LAST_UNKNOWN  :=0;        (*INDEX TO LAST UNKNOWN ADDED TO UNKNOWN ARRAY*)
00000460 2 FRAME_REC     :=0;        (*THERE IS CURRENTLY NO FRAME   INFORMATION PRESENT*)
00000464 2 FREE          :=0;        (*INDEX TO NEXT FREE WORD IN REMEMBER ARRAY*)
00000468 2
00000468 2 WITH ENVIRONMENT^.SYMBOL_TABLE[0]^ DO
00000476 2 PROG_INIT(PTR(ADDR(PATH.SOURCEFILE_NAME)),PATH.SOURCEFILE_DISC,SOURCEFILE_NO,ENVIRONMENT^.PROCESSOR,LANGUAGE,ERROR);
0000049E 2 IF ERROR<>0 THEN
000004A8 2   BEGIN (*PROG_INIT error*)
000004A8 2   IF ERROR=DB_NOT_FOUND THEN
000004B6 2     BEGIN  (* "File not found, file=xxx:comp_db " *)
000004B6 2     NEW(DEST);
000004C3 2     DEST^.LEN:=0;
000004CE 2     WITH ENVIRONMENT^.SYMBOL_TABLE[0]^ DO
000004DC 2       FMT_FILENOTFOUND(PATH.SOURCEFILE_NAME,PATH.SOURCEFILE_DISC,DEST^);
000004F3 2     STATUS_LINE(DEST,CA000H,-1);(*Outut error to status line, 0C000H=clear on nxt keystroke, 0A000H=clear on new msg
0000050C 2     DISPOSE(DEST);
0000051E 2     END;   (* "File not found, file=xxx:comp_db " *)
0000051E 2   GOTO 1; (*All PROG_INTI errors are fatal in the sense that I will not clear ERROR*)
00000522 2   END;  (*PROG_INIT error*)
00000522 2 $PAGE$
00000522 2 (*********** INITIALIZE FRAME_ARRAY ***********)
00000522 2 PROC_NO:=0;          (*ASSUME IT IS A PROGRAM LEVEL TRACE*)
00000526 2 POSITION:=0;           (*Initialize to first data record*)
0000052A 2 MORE:=TRUE;            (*Force read of 1st data record*)
00000530 2 WHILE MORE DO
00000538 2   BEGIN  (*Skip all message records*)
00000538 2 $IF M68000
00000538 2   NO_READFWD (RAW,DATA_BYTE,DATA_ADDR,BYTE_INDEX,SYMBOL_NO,POSITION,ERROR)   (*READ FIRST DATA*)
00000562 2 $ELSE
00000562 2   READFWD (RAW,DATA_BYTE,DATA_ADDR,BYTE_INDEX,SYMBOL_NO,POSITION,ERROR); (*READ FIRST DATA*)
00000562 2 $ENDIF
00000562 2   IF ERROR<>0 THEN
0000056C 2     BEGIN
0000056C 2     IF ERROR=EOF THEN ERROR:=0;
00000580 2     GOTO 1;
00000584 2     END;
00000584 2   IF RAW^.TYP<>MESSAGE_ THEN MORE:=FALSE;
00000598 2   END;   (*Skip all message records*)
```

```
0000059A  2  IF RAW^.TYP=FRAME_ THEN
000005AA  2    BEGIN(*THERE IS A FRAME RECORD*)
000005AA  2    FRONTIER_REC:=RAW^.REC_NO+1;     (*The frontier is the first record past the frame*)
000005D4  2    PROC_COUNT:=(RAW^.LEN-(MAX_SEG*2 +3)) DIV 3;       (*INITIALIZE NUMBER OF PROCS IN PROC ARRAY*)
000005C6  2    FOR I:=1 TO PROC_COUNT DO WITH FRAME_ARRAY^[I] DO
000005EE  2      BEGIN
000005EE  2      PROC_NO:=RAW^.STACK_INFO[I].PROC_NO;
00000606  2      PROC_STACK(SOURCEFILE_NO,PROC_NO,RECURSION,PARAM_REL_MIN[1],PARAM_REL_MAX[1],VAR_REL_MIN[1],VAR_REL_MAX[1],ERROR
00000643  2      IF ERROR=NOT_FOUND THEN STATUS_LINE(STRNG_PTR(ADDR(E100)),0000CH,-1);(*Err to status line, clear on next keystr
0000065E  2      IF ERROR<>0 THEN GOTO 1;
0000067C  2      EXTEND(PARAM_REL_MIN[1], PARAM_REL_MIN); (*SIGN EXTEND*)
00000694  2      EXTEND(PARAM_REL_MAX[1], PARAM_REL_MAX); (*SIGN EXTEND*)
000006AC  2      EXTEND(VAR_REL_MIN[1],   VAR_REL_MIN);   (*SIGN EXTEND*)
000006C4  2      EXTEND(VAR_REL_MAX[1],   VAR_REL_MAX);   (*SIGN EXTEND*)
000006DC  2      END;
000006F0  2    PROC_NO:=FRAME_ARRAY^[1].PROC_NO;  (*GET THE PROC# OF THE PROC BEING TRACED*)
000006FA  2    END;  (*THERE IS A FRAME RECORD*)
000006FA  2  1:END;
00000000  1  $PAGE$
00000000  1  $GLOBPROC OFF$
00000000  1  (*****************************************************************)
00000000  1  (********* GET_DATABASE ******************************************)
00000000  1  (*****************************************************************)
00000000  1  (* INPUTS:                                                       *)
00000000  1  (* FLAG          0==> call STATIC_VAR, 1==> call DYNAMIC_VAR      *)
00000000  1  (* PROC_NO       FLAG=0 ==> procedure number of procedure being traced   *)
00000000  1  (*               FLAG=1 ==> procedure number to which ADR is scoped.     *)
00000000  1  (* V_TYPE        FLAG=0 ==> not used.                                    *)
00000000  1  (*               FLAG=1 ==> 0=ADR is parameter, 1=ADR is local variable  *)
00000000  1  (* ADR           FLAG=0 ==> static address  (physical).                  *)
00000000  1  (*               FLAG=1 ==> dynamic address (physical).                  *)
00000000  1  (*****************************************************************)
00000000  1  (* OUTPUTS:                                                      *)
00000000  1  (* FOO           Pointer to the new node.                        *)
00000000  1  (* ERROR         Error flag.                                     *)
00000000  1  (*****************************************************************)
00000000  1  PROCEDURE GET_DATABASE(FLAG:INT,PROC_NO:INT; V_TYPE:BYTE; ADR:INTEGER; VAR FOO:NODE_PTR; VAR ERROR:INT);
00000000  2  VAR
00000000  2  DBSIZE        :INT;            (*Maximum size (words), then actual size of db information for new node*)
00000002  2  I             :INT;            (*Index for searching REMEMBER_ARRAY*)
00000004  2  FOUND         :BOOLEAN;        (*True if data base information found in remember array*)
00000005  2  DYNAMIC       :BOOLEAN;        (*True if flag is 1, used to save space *)
00000702  2
00000702  2  BEGIN
00000702  2  I:=0; (*Get index to first node in array*)
00000706  2  FOUND:=FALSE;
0000070A  2  DYNAMIC := (FLAG=DYNAMIC_ADDR);      (* DYNAMIC:=TRUE IFF FLAG = Dynamic flag *)
0000071C  2  WHILE (I<FREE) AND NOT FOUND DO
00000730  2    BEGIN (*Look at the node indexed by I*)
00000738  2    FOO:=NODE_PTR(ADDR(REMEMBR_ARRAY^[I])); (*Pt to the node of interest in REMEMBER_ARRAY*)
00000748  2    I:=I+FOO^.NODESIZE; (*Get index to next node in REMEMBER_ARRAY*)
00000750  2    IF (DYNAMIC AND (FOO^.PROC_NO=PROC_NO)) OR (NOT DYNAMIC) THEN
00000779  2      IF SHIFT(SHIFT(FOO^.DATABASE.FLAGS,12),-15)=FLAG THEN
00000796  2        IF GE(ADR,FOO^.DATABASE.ADDRESS) THEN
000007B2  2          IF LE(ADR,FOO^.MAX)
000007CE  2            THEN FOUND:=TRUE;
000007D4  2    END;  (*Look at the node indexed by I*)
000007D9  2  IF NOT FOUND THEN
000007E0  2    BEGIN (* We need a new node*)
000007E0  2    FOO:=NODE_PTR(ADDR(REMEMBR_ARRAY^[FREE])), (*Pt to the next free location in REMEMBER_ARRAY*)
000007F4  2    DBSIZE:=(REMEMBRSIZE-FREE)-FIXEDSIZE; (*Compute how much room I have for call to data base routine*)
00000802  2    IF DYNAMIC
0000080A  2      THEN DYNA_VAR  (SOURCEFILE_NO,PROC_NO,ADR[1],PTR(ADDR(FOO^.DATABASE)),V_TYPE,DBSIZE,ERROR)
00000844  2      ELSE
00000844  2      BEGIN
00000844  2          STATIC_VAR(SOURCEFILE_NO,PROC_NO,PTR(ADDR(ENVIRONMENT^.ABSFILE_NAME)),ENVIRONMENT^.ABSFILE_DISC,
00000844  2        ADR,PTR(ADDR(FOO^.DATABASE)),DBSIZE,ERROR);
00000082  2      END;
00000882  2    IF ERROR=OUT_OF_SPACE THEN
00000890  2      BEGIN (*Try a second time*)
00000890  2      REMEMBR_OVFLW:=TRUE; (* To show that a saved pointer will be bad,set to false in INIT_STRUC *)
00000896  2      FREE:=0; (*Clear the remember array*)
0000089A  2      FOO:=NODE_PTR(ADDR(REMEMBR_ARRAY^[FREE])); (*Pt to the next free location in REMEMBER_ARRAY*)
000008AE  2      DBSIZE:=REMEMBRSIZE-FIXEDSIZE;
```

```
00000SB4  2      IF DYNAMIC
000009BC  2        THEN DYNA_VAR  (SOURCEFILE_NO,PROC_NO,ADR[I],PTR(ADDR(FOO^.DATABASE)),V_TYPE,DBSIZE,ERROR)
000009F6  2        ELSE STATIC_VAR(SOURCEFILE_NO,PROC_NO,PTR(ADDR(ENVIRONMENT^.ABSFILE_NAME)),ENVIRONMENT^.ABSFILE_DISC,
000009F6  2        ADR,PTR(ADDR(FOO^.DATABASE)),DBSIZE,ERROR);
00000934  2      END;  (*Try a second time*)
00000934  2    IF ERROR<>0 THEN
0000093E  2      BEGIN (*Failure*)
0000093E  2      FOO:=NIL;
00000941  2      IF (ERROR=NOT_FOUND) OR (ERROR=INVALID_TYPE) THEN ERROR:=0;
0000096A  2      IF ERROR=OUT_OF_SPACE THEN STATUS_LINE(STRNG_PTR(ADDR(E003)),0C000H,-1); (*Err to status line, clear on nxt key*)
00000990  2      END   (*Failure*)
00000994  2      ELSE
00000994  2      BEGIN (*Success, build the rest of the node's fields*)
00000994  2      FOO^.NODESIZE:=DBSIZE+FIXEDSIZE,         (*NODESIZE, FIXEDSIZE, DBSIZE IN WORDS*)
000009A4  2      FREE:=FREE+FOO^.NODESIZE;                (*Find next free locatin in rememor array*)
000009B2  2      IF NOT DYNAMIC THEN LOGICAL_TO_PHYS(FOO^.DATABASE.ADDRESS,FOO^.DATABASE.ADDRESS);
000009D6  2      ADD32(FOO^.DATABASE.SIZE,FOO^.DATABASE.ADDRESS,FOO^.MAX);  (*Find max address (static==>abs, dynamic==>stack rel
00000A00  2      SUBTRACT32(FOO^.MAX,ONE,FOO^.MAX);
00000A26  2      FOO^.PROC_NO    :=PROC_NO;
00000A32  2      END; (*Success, build the rest of the node's fields*)
00000A32  2    END;  (* We need a new node*)
00000A32  2  END;
00000000  1  $PAGE$
00000000  1  $GLOBPROC OFF$
00000000  1  (*****************************************************************************)
00000000  1  (********** OBJECT OF REF ? ***************************************************)
00000000  1  (*****************************************************************************)
00000000  1  (* Is the DATA_ADDR the object of a reference paramater                      *)
00000000  1  (*****************************************************************************)
00000000  1  (* INPUTS:                                                                   *)
00000000  1  (* DATA_ADDR   Physical address of data byte.                                *)
00000000  1  (*****************************************************************************)
00000000  1  (* OUTPUTS:                                                                  *)
00000000  1  (* OBJECT_OF_REF  TRUE or FALSE                                              *)
00000000  1  (* FOO            Pointer to a NODE containing the data base info.           *)
00000000  1  (* STRUC_ADDR     If OBJECT_OF REF = TRUE then                               *)
00000000  1  (*                Abs address of the reference containing DATA_ADDR.         *)
00000000  1  (* ERROR          0                =no error.                                *)
00000000  1  (*                PROG_NOT_FOUND =No data base for requested file.           *)
00000000  1  (*                DUP_PROCS      =Two or more procs with same name.          *)
00000000  1  (*                OUT_OF_SPACE   =data base for symbol is too large.         *)
00000000  1  (*                Codes >=20     =fatal error in data base routines.         *)
00000000  1  (*****************************************************************************)
00000000  1  FUNCTION OBJECT_OF_REF(DATA_ADDR:INTEGER; VAR FOO:NODE_PTR; VAR STRUC_ADDR:INTEGER; VAR ERROR:INT):BOOLEAN;
00000001  2  VAR
00000001  2  I        :INT;
00000A3A  2
00000A3A  2  BEGIN
00000A3A  2  OBJECT_OF_REF:=FALSE;
00000A3E  2  (*Search REF_ARRAY to see if DATA_ADDR is in the object of a reference *)
00000A3E  2  I:=1;
00000A44  2  WHILE (I<=REF_COUNT)
00000A44  2    AND (LT(DATA_ADDR, REF_ARRAY^[I].OBJECT_MIN)) OR (GT(DATA_ADDR, REF_ARRAY^[I].OBJECT_MAX)) DO I:=I+1;
00000A94  2  IF I<=REF_COUNT THEN WITH REF_ARRAY^[I] DO
00000AC2  2    BEGIN (*DATA IS OBJECT OF A REF*) (*Get db for the referece, use its stack adddress*)
00000AC2  2    GET_DATABASE(DYNAMIC_ADDR,PROC_NO,PARAMATER,ADDR_OF_REF,FOO,ERROR);
00000AE3  2    IF FOO<>NIL THEN
00000AF2  2      BEGIN
00000AF2  2      OBJECT_OF_REF:=TRUE;
00000AF8  2      STRUC_ADDR:=REF_ARRAY^[I].OBJECT_MIN; (*ABS ADR OF STRUC IS THE REF ITSELF*)
00000E0E  2      END;
00000E0E  2    END;  (*DATA IS OBJECT OF A REF*)
00000B0E  2  END;
00000000  1  $PAGE$
00000000  1  $GLOBPROC OFF$
00000000  1  (*****************************************************************************)
00000000  1  (********** DYNAMIC ? **********************************************************)
00000000  1  (*****************************************************************************)
00000000  1  (* Is DATA_ADDR a dynamic variable, value parameter or REF parameter?  *)
00000000  1  (*****************************************************************************)
00000000  1  (* INPUTS:                                                                   *)
00000000  1  (* DATA_ADDR   Physical address of data byte.                                *)
00000000  1  (*****************************************************************************)
00000000  1  (* OUTPUTS:                                                                  *)
00000000  1  (* DYNAMIC     TRUE or FALSE.                                                *)
00000000  1  (* FOO         Ptr to node containing data base info. Iff DYNAMIC=TRUE *)
00000000  1  (* STRUC_ADDR     If DYNAMIC=TRUE then abs addr of the struc                 *)
```

```
00000000 1 (* ERROR          0              =no error.                            *)
00000000 1 (*                PROG_NOT_FOUND =No data base for requested file.     *)
00000000 1 (*                DUP_PROCS      =Two or more procs with same name.    *)
00000000 1 (*                OUT_OF_SPACE   =data base for symbol is too large.   *)
00000000 1 (*                Codes >=20     =fatal error in data base routines.   *)
00000000 1 (**********************************************************************)
00000000 1 FUNCTION DYNAMIC(DATA_ADDR:INTEGER; VAR FOO:NODE_PTR; VAR STRUC_ADDR:INTEGER; VAR ERROR:INT):BOOLEAN;
00000001 2 VAR
00000001 2 V_TYPE        :BYTE;
00000002 2 OFFSETT       :INTEGER;     (*OFFSETT FROM STACK*)
00000006 2 I             :INT;
00000008 2 RESULT        :RESULT_TYPE;
00000B1C 2
00000B1C 2 BEGIN
00000B1C 2 (*SEARCH FRAME ARRAY IS DATA ADDRESS ON SOME PROC'S STACK*)
00000B1C 2 DYNAMIC:=FALSE;
00000B20 2 I:=1;
00000B26 2 RESULT:=NOTFOUND;
00000B2C 2 WHILE (I<=PROC_COUNT) AND (RESULT=NOTFOUND) DO
00000B4E 2   BEGIN
00000B4E 2   IF NE(FRAME_ARRAY^[I].PARAM_REL_MAX,ZERO) THEN  (*REL_MAX=0 ==> no paramaters*)
00000B74 2     IF LE(DATA_ADDR, FRAME_ARRAY^[I].PARAM_ABS_MAX) THEN
00000B9C 2       IF GE(DATA_ADDR, FRAME_ARRAY^[I].PARAM_ABS_MIN) THEN
00000BC0 2         BEGIN RESULT:=FOUND; V_TYPE:=PARAMATER; END;
00000BC8 2   IF RESULT=NOTFOUND THEN
00000BD4 2      IF NE(FRAME_ARRAY^[I].VAR_REL_MAX,ZERO) THEN  (*REL_MAX=0 ==> no variables*)
00000BFE 2        IF FRAME_ARRAY^[I].RECURSION=TRUE THEN
00000C1C 2          IF LE(DATA_ADDR, FRAME_ARRAY^[I].VAR_ABS_MAX) THEN
00000C40 2            IF GE(DATA_ADDR, FRAME_ARRAY^[I].VAR_ABS_MIN) THEN
00000C68 2              BEGIN RESULT:=FOUND; V_TYPE:=VARIABLE; END;
00000C72 2   IF RESULT=NOTFOUND THEN I:=I+1;
00000C82 2   END;
00000C86 2
00000C86 2 IF RESULT=FOUND THEN WITH FRAME_ARRAY^[I] DO
00000CA4 2   BEGIN (*DATA IS DYNAMIC*)
00000CA4 2   SUBTRACT32(DATA_ADDR, FRAME_ARRAY^[I].STACK, OFFSETT);
00000CC6 2   GET_DATABASE(DYNAMIC_ADDR,PROC_NO,V_TYPE,OFFSETT,FOO,ERROR);
00000CF6 2   IF FOO<>NIL THEN
00000D00 2     BEGIN
00000D00 2     DYNAMIC:=TRUE;
00000D06 2     ADD32(FOO^.DATABASE.ADDRESS,STACK,STRUC_ADDR); (*ABS ADR OF STRUC IS STACK OFFSET+STACK*)
00000D2A 2     END;
00000D2A 2   END;  (*DATA IS DYNAMIC*)
00000D2A 2 END;
00000000 1 $PAGE$
00000000 1 $GLOBPROC OFF$
00000000 1 (**********************************************************************)
00000000 1 (*********** STATIC ? **************************************************)
00000000 1 (**********************************************************************)
00000000 1 (* Is DATA_ADDR a static  variable?                                    *)
00000000 1 (**********************************************************************)
00000000 1 (* INPUTS:                                                             *)
00000000 1 (* PHYSICAL_DATA_ADDR Physical address of data byte.                   *)
00000000 1 (**********************************************************************)
00000000 1 (* OUTPUTS:                                                            *)
00000000 1 (* STATIC        TRUE or FALSE.                                        *)
00000000 1 (* FOO           Ptr to node containing data base info. Iff STATIC=TRUE  *)
00000000 1 (* STRUC_ADDR       If STATIC =TRUE then abs addr of the struc (physical)*)
00000000 1 (* ERROR          0              =no error.                            *)
00000000 1 (*                PROG_NOT_FOUND =No data base for requested file.     *)
00000000 1 (*                DUP_PROCS      =Two or more procs with same name.    *)
00000000 1 (*                OUT_OF_SPACE   =data base for symbol is too large.   *)
00000000 1 (*                Codes >=20     =fatal error in data base routines.   *)
00000000 1 (**********************************************************************)
00000000 1 FUNCTION STATIC(PHYSICAL_DATA_ADDR:INTEGER; VAR FOO:NODE_PTR;
00000000 2         VAR STRUC_ADDR:INTEGER;  VAR ERROR:INT):BOOLEAN;
00000001 2 VAR
00000001 2 RESULT          :RESULT_TYPE;
00000D38 2 BEGIN (*DATA IS STATIC OR UNDEFINED*)
00000D38 2 STATIC:=FALSE;
00000D3C 2 GET_DATABASE(STATIC_ADDR,PROC_NO,VARIABLE,PHYSICAL_DATA_ADDR,FOO,ERROR);
00000D62 2 IF FOO<>NIL THEN
00000D6C 2   BEGIN
00000D6C 2   STATIC:=TRUE;
00000D72 2   STRUC_ADDR:=FOO^.DATABASE.ADDRESS; (*ABS ADR OF STRUC=RELATIVE ADDRESS*)
00000D80 2   END;
```

```
00000D80  2  END;
00000000  1
00000000  1  $GLOBPROC OFF$
00000000  1  (*************************************************************************)
00000000  1  (********** PREVIOUS_UNKNOWN ? *****************************************)
00000000  1  (*************************************************************************)
00000000  1  (* SEARCH FOR DATA_ADDR IN UNKNOWN ARRAY.                               *)
00000000  1  (*************************************************************************)
00000000  1  (* INPUTS:                                                              *)
00000000  1  (* DATA_ADDR   Data address.                                            *)
00000000  1  (* OUTPUTS:                                                             *)
00000000  1  (* RESULT      FOUND ==> DATA_ADDR is in UNKNOWN_ARRAY.                 *)
00000000  1  (*************************************************************************)
00000000  1  FUNCTION PREVIOUS_UNKNOWN(DATA_ADDR:INTEGER):BOOLEAN;
00000001  2  VAR
00000001  2  I:INT;
00000D8E  2  BEGIN
00000D8E  2  I:=1;
00000D94  2  WHILE (I<=UNKNOWN_COUNT) AND (UNKNOWN_ARRAY^[I]<>DATA_ADDR) DO I:=I+1;
00000DC3  2  IF I<=UNKNOWN_COUNT
00000DD4  2    THEN PREVIOUS_UNKNOWN:=TRUE
00000DDE  2    ELSE PREVIOUS_UNKNOWN:=FALSE;
00000DE2  2  END;
00000000  1  $PAGE$
00000000  1  $GLOBPROC OFF$
00000000  1  (*************************************************************************)
00000000  1  (********** NEWFRONTIER *************************************************)
00000000  1  (*************************************************************************)
00000000  1  (* Build all refs from old frontier record to new frontier record.      *)
00000000  1  (* Leave with new frontier record in RAW^.                              *)
00000000  1  (*************************************************************************)
00000000  1  (* INPUTS:                                                              *)
00000000  1  (* NEWFRONTIER_REC Fngr record # of requested new frontier.             *)
00000000  1  (*************************************************************************)
00000000  1  (* OUTPUTS:                                                             *)
00000000  1  (* ERROR           Fngr error.                                          *)
00000000  1  (*************************************************************************)
00000000  1  PROCEDURE NEWFRONTIER(NEWFRONTIER_REC:INT; VAR ERROR:INT);
00000000  2  VAR
00000000  2  CURR               :INT;         (*LOCAL POSITION FOR BUILDING FRAME   (THIS IS NOT A FNGR RECORD#)*)
00000002  2  I                  :INT;
00000004  2  ABS_STRUC_ADDR     :INTEGER;     (*ABSOLUTE ADDRESS OF THE STRUCTURE IFF RESULT=FOUND OR RET*)
00000008  2  DATA_BYTE          :BYTE;        (*DATA BYTE FROM FOOTOC RECORD*)
00000009  2  DATA_ADDR          :INTEGER;     (*DATA ADDRESS FROM FOOTOC*)
0000000E  2  BYTE_INDEX         :INT;         (*DUMMY PARAMETER*)
00000010  2  SYMBOL_NO          :INT;         (*DUMMY PARAMETER*)
00000012  2  FOO                :NODE_PTR;    (*PTR TO CURRENT NODE OF INTREST*)
00000DF0  2  BEGIN
00000DF0  2  CURR:=(FRONTIER_REC - ENVIRONMENT^.FIRST_DATA_REC)*2;(*CONVERT OLD FRONTIER RECORD# TO A POSITION*)
00000E06  2  #IF M68000
00000E06  2  GO_READFWD (RAW,DATA_BYTE,DATA_ADDR,BYTE_INDEX,SYMBOL_NO,CURR,ERROR); (*Read the old FRONTIER record *)
00000E30  2  #ELSE
00000E30  2  READFWD (RAW,DATA_BYTE,DATA_ADDR,BYTE_INDEX,SYMBOL_NO,CURR,ERROR); (*Read the old FRONTIER record *)
00000E30  2  #ENDIF
00000E30  2  WHILE (RAW^.REC_NO<>NEWFRONTIER_REC) AND (ERROR=0) DO
00000E54  2    BEGIN (*Get to requesting record, build references on the way*)
00000E54  2    IF RAW^.DATA_STATUS THEN
00000E5C  2      IF DYNAMIC(DATA_ADDR,FOO,ABS_STRUC_ADDR,ERROR) THEN
00000E80  2        IF SHIFT(FOO^.DATABASE.FLAGS,11)<0  THEN  BUILD_REF(DATA_ADDR,DATA_BYTE,FOO,ABS_STRUC_ADDR);
00000EB0  2    IF ERROR=0 THEN
00000EBA  2  #IF M68000
00000EDA  2    GO_READFWD (RAW,DATA_BYTE,DATA_ADDR,BYTE_INDEX,SYMBOL_NO,CURR,ERROR);
00000EE4  2  #ELSE
00000EE4  2    READFWD (RAW,DATA_BYTE,DATA_ADDR,BYTE_INDEX,SYMBOL_NO,CURR,ERROR),
00000EE4  2  #ENDIF
00000EE4  2    END;  (*Get to requesting record, build references on the way*)
00000EE8  2  FRONTIER_REC:=NEWFRONTIER_REC; (*Update the global FRONTIER_REC*)
00000EEE  2  (*RAW^ contains the newfrontier_rec*)
00000EEE  2  END;
00000000  1  $PAGE$
00000000  1  $GLOBPROC OFF$
00000000  1  (*************************************************************************)
00000000  1  (********** NEWFRAME ****************************************************)
00000000  1  (*************************************************************************)
00000000  1  (* I do not have the correct frame record in memory, so get it, clear   *)
00000000  1  (* all frame dependent stuff, build refs from the new frame to the      *)
00000000  1  (* requesting record and leave requesting record in RAW^.               *)
```

```
00000000  1  (************************************************************************)
00000000  1  (* INPUTS:                                                               *)
00000000  1  (* RAW         Ptr to the footdc record requesting a new frame           *)
00000000  1  (*             This same fngr rec is in RAW^ on exit.                    *)
00000000  1  (************************************************************************)
00000000  1  (* OUTPUTS:                                                              *)
00000000  1  (* ERROR       FNGR ERROR.                                               *)
00000000  1  (************************************************************************)
00000000  1  PROCEDURE NEWFRAME (VAR RAW:DATAREC_PTR; VAR ERROR:INT);
00000000  2  LABEL 1;
00000000  2  VAR
00000000  2  REQUESTING_REC    :INT;        (*FNGR RECORD # OF REQUESTING RECORD*)
00000002  2  CURR              :INT;        (*LOCAL POSITION FOR BUILDING FRAME   (THIS IS NOT A FNGR RECORD#)*)
00000004  2  I                 :INT;
00000006  2  DATA_BYTE    :BYTE;     (*DUMMY PARAMETER*)
00000007  2  DATA_ADDR    :INTEGER;  (*DUMMY PARAMETER*)
0000000C  2  BYTE_INDEX   :INT;      (*DUMMY PARAMETER*)
0000000E  2  SYMBOL_NO    :INT;      (*DUMMY PARAMETER*)
00000EF6  2
00000EF6  2  BEGIN
00000EF6  2  REQUESTING_REC:=RAW^.REC_NO;                        (*SAVE FNGR RECORD# OF RECORD REQUESTING NEW FRAME*)
00000F02  2  CURR:=(RAW^.FRAME - ENVIRONMENT^.FIRST_DATA_REC)*2;  (*CONVERT FRAME   FNGR RECORD# TO A POSITION*)
00000F1E  2  READFWD (RAW,DATA_BYTE,DATA_ADDR,BYTE_INDEX,SYMBOL_NO,CURR,ERROR); (*Read the old FRONTIER record*)
00000F4A  2  IF ERROR<>0 THEN GOTO 1;
00000F58  2
00000F58  2  FOR I:=1 TO PROC_COUNT DO WITH FRAME_ARRAY^[I] DO
00000F84  2    BEGIN (*Build frame array*)
00000F84  2    STACK:=RAW^.STACK_INFO[I].STACK;
00000FA2  2    ADD32(PARAM_REL_MIN, STACK, PARAM_ABS_MIN);
00000FBC  2    ADD32(PARAM_REL_MAX, STACK, PARAM_ABS_MAX);
00000FD8  2    ADD32(VAR_REL_MIN,  STACK,  VAR_ABS_MIN);
00000FF4  2    ADD32(VAR_REL_MAX,  STACK,  VAR_ABS_MAX);
00001010  2    END;  (*Build frame array*)
00001024  2  FOR I:=0 TO MAX_SEG DO SEG[I]:=RAW^.SEGMENTS[I]; (*Build SEG_REG_ARRAY*)
00001058  2  FRAME_REC      :=RAW^.REC_NO;     (*Save fngr record# of the new current frame record*)
00001064  2  UNKNOWN_COUNT  :=0;               (*Clear UNKNOWN_ARRAY*)
00001068  2  REF_BYTE_COUNT :=0;               (*Clear REF_STRUC currently under construction*)
0000106C  2  REF_COUNT      :=0;               (*Clear REF_ARRAY of all refs*)
00001070  2  FRONTIER_REC   :=RAW^.REC_NO+1;   (*The frontier is the first record past the frame*)
00001080  2  NEWFRONTIER(REQUESTING_REC,ERROR); (*Build references from  FRONTIER_REC to REQUESTING_REC*)
00001092  2  (*RAW^ now contains the same record it contained on entry*)
00001092  2  1:END;
00000000  1  $PAGE$
00000000  1  $GLOBPROC OFF$
00000000  1  (************************************************************************)
00000000  1  (*********** WHATISIT ***************************************************)
00000000  1  (************************************************************************)
00000000  1  (* This routine returns data base information for the given DATA_ADDR. *)
00000000  1  (* DATA_ADDR may be the address of any of the following types of data.  *)
00000000  1  (* Undefined.....................................RESULT=NOTFOUND        *)
00000000  1  (* Static........................................RESULT=FOUND           *)
00000000  1  (* Dynamic variable..............................RESULT=FOUND           *)
00000000  1  (* Value Parameter...............................RESULT=FOUND           *)
00000000  1  (* REF Parameter (reference to the object).......RESULT=FOUND           *)
00000000  1  (* REF Parameter (reference to the pointer)......RESULT=REF             *)
00000000  1  (*                                                                       *)
00000000  1  (* It is first necessary to determine if the reference is to the object*)
00000000  1  (* of a pointer, a dynamic or a static.  After this is determined, the *)
00000000  1  (* list of node is searched to see if the data base information is     *)
00000000  1  (* already in RAM,if not, the approoriate data base rountine is called *)
00000000  1  (* and the result added to the list.  If the reference is to a pointer *)
00000000  1  (* the result flag is then set to REF.                                  *)
00000000  1  (************************************************************************)
00000000  1  (* INPUTS:                                                               *)
00000000  1  (* DATA_ADDR   Physical address of data byte.                            *)
00000000  1  (* RAW         Pointer to footdc data record.                            *)
00000000  1  (************************************************************************)
00000000  1  (* OUTPUTS:                                                              *)
00000000  1  (* RESULT          (FOUND,NOTFOUND,REF,FRAME,PRG)                        *)
00000000  1  (* FCO             If FOUND then ptr to NODE containing data base info.  *)
00000000  1  (*                 If REF   then ptr to NODE containing data base info.  *)
00000000  1  (*                 If NOTFOUND then unchanged.                           *)
00000000  1  (* STRUC_ADDR      If FOUND & not object of var then phys addr of struc *)
00000000  1  (*                 If FOUND &     object of var then phys addr of object*)
00000000  1  (*                 If NOTFOUND               then undefined             *)
00000000  1  (*                 If REF                    then phys addr of ptr      *)
```

```
00000000 1 (* ERROR            0              =no error.                              *)
00000000 1 (*                 PROG_NOT_FOUND =No data base for requested file.        *)
00000000 1 (*                 DUP_PROCS      =Two or more procs with same name.       *)
00000000 1 (*                 OUT_OF_SPACE   =data base for symbol is too large.      *)
00000000 1 (*                 Codes >=20     =fatal error in data base routines.      *)
00000000 1 (**************************************************************************)
00000000 1 PROCEDURE WHATISIT(DATA_ADDR:INTEGER; RAW:DATAREC_PTR;
00000000 2          VAR FOO:NODE_PTR; VAR STRUC_ADDR:INTEGER; VAR RESULT:RESULT_TYPE; VAR ERROR:INT);
00000000 2 LABEL 1;
0000109A 2 BEGIN   (*PROCEDURE GET_SYMBOL_INFO*)
0000109A 2 RESULT:=NOTFOUND;
000010A2 2 IF RAW^.TYP=FRAME_   THEN BEGIN RESULT:=FRAME; GOTO 1; END;
000010BE 2 IF RAW^.PROC_STATUS  THEN BEGIN RESULT:=PRG;   GOTO 1; END;
000010D6 2 IF OBJECT_OF_REF (DATA_ADDR,FOO,STRUC_ADDR,ERROR) THEN BEGIN RESULT:=FOUND; GOTO 1; END;
00001108 2 IF ERROR<>0 THEN GOTO 1;
00001116 2 IF DYNAMIC(DATA_ADDR,FOO,STRUC_ADDR,ERROR) THEN
0000113E 2   BEGIN IF SHIFT(FOO^.DATABASE.FLAGS,11)<0 THEN RESULT:=REF ELSE RESULT:=FOUND; GOTO 1; END;
0000116A 2 IF ERROR<>0 THEN GOTO 1;
00001178 2 IF PREVIOUS_UNKNOWN(DATA_ADDR) THEN BEGIN RESULT:=NOTFOUND; GOTO 1; END;
00001196 2 IF STATIC (DATA_ADDR,FOO,STRUC_ADDR,ERROR) THEN BEGIN RESULT:=FOUND;    GOTO 1; END;
000011C3 2 IF ERROR<>0 THEN GOTO 1;
000011D6 2 BUILD_UNKNOWN(DATA_ADDR);
000011E2 2 1 END;  (*PROCEDURE GET_SYMBOL_INFO*)
00000000 1 $PAGE$
00000000 1 $GLOBPROC OFF$
00000000 1 (**************************************************************************)
00000000 1 (*********** INIT_STRUC ***************************************************)
00000000 1 (**************************************************************************)
00000000 1 (* Initialize the structure in PRIMITIVE.                                  *)
00000000 1 (**************************************************************************)
00000000 1 (* INPUTS:                                                                 *)
00000000 1 (* PRIMITIVE   Information about current STRUC.                            *)
00000000 1 (* DATA_ADDR   Address of data byte iff RAW^ is a data cycle.              *)
00000000 1 (* FOO         Pointer to node for current data iff data cycle             *)
00000000 1 (* STRUC_ADDR  Abs addr of the struc                                       *)
00000000 1 (**************************************************************************)
00000000 1 (* OUTPUTS:                                                                *)
00000000 1 (* PRIMITIVE   Information about current STRUC.                            *)
00000000 1 (**************************************************************************)
00000000 1 PROCEDURE INIT_STRUC(PRIMITIVE:PRIMITIVE_PTR; FOO:NODE_PTR; STRUC_ADDR:INTEGER; DATA_ADDR:INTEGER);
00000000 2 VAR
00000000 2 J:INT;
00000002 2 BYTE_INDEX:INT;
00000004 2 ERROR:INT;
00000006 2 P_TEMP:PTR;  (* Need to hold this until I can figure out the offset in case of overflow *)
000011EA 2
000011EA 2 BEGIN
000011EA 2 REMEMBR_OVFLW:=FALSE;   (* This is a new structure so don't worry about overflow *)
000011EE 2 OLD_DATADDR:=DATA_ADDR; (* Hold on to this in case of overflow of REMEMBR_ARRAY *)
000011F4 2 PRIMITIVE^.STRUC_ADDR:=STRUC_ADDR;
000011FE 2 WITH PRIMITIVE^ DO BEGIN
00001204 2   P:=PTR(ADDR(FOO^.DATABASE));  (*Initialize the static variable P which will travers the data base*)
00001210 2   P_TEMP := P;
00001216 2   IF RAW^.WRITE_STATUS
00001222 2     THEN STATUS:=WRITEE
00001230 2     ELSE STATUS:=READD;
00001238 2   FMTSYM(SYM,P,DATA_ADDR,ENVIRONMENT^.SYMBOL_TABLE[0]^.LANGUAGE,STRUC_ADDR,BYTE_INDEX,STRUC_SIZE,PAD,RAW);
00001278 2   OLD_OFFSET:=(GENERIC_INT(P) - GENERIC_INT(P_TEMP));   (* Calculate offset of primitive element *)
00001284 2   FOR J:=0 TO STRUC_SIZE-1 DO BEGIN STRUC[J]:=0; USED[J]:=0; END; (*0=FALSE*)
000012D0 2
000012D0 2   (*GET SYMBOL PATH*)
000012D0 2   SYM_PATH:=ENVIRONMENT^.SYMBOL_TABLE[0]^.PATH; (*This moves a bad PROC_NAME which I will subsequently fix*)
000012EC 2   IF FOO^.PROC_NO=0  (*PROC_NO=0==> PROGRAM LEVEL STATIC*)
000012F8 2     THEN SYM_PATH.PROC_NAME[0]:=0  (*PROGRAM LEVEL STATIC HAS NO PROC NAME IN PATH*)
00001306 2     ELSE SUB_NAME (SOURCEFILE_NO,FOO^.PROC_NO, PTR(ADDR(SYM_PATH.PROC_NAME)),ERROR);
0000132C 2   IF ERROR=NOT_FOUND THEN SYM_PATH.PROC_NAME[0]:=-1; (* -1==> no proc name found for good proc #*)
00001344 2   END; (*END WITH*)
00001344 2 END;
00000000 1 $PAGE$
00000000 1 $GLOBPROC OFF$
00000000 1 (**************************************************************************)
00000000 1 (*********** IN_STRUC *****************************************************)
00000000 1 (**************************************************************************)
00000000 1 (* See if current data byte is in current structure.                       *)
00000000 1 (**************************************************************************)
```

```
00000000  1  (* INPUTS:                                                          *)
00000000  1  (* RAW         Pointer to footdc data record.                       *)
00000000  1  (* DATA_ADDR   Address of data byte.                                *)
00000000  1  (* PRIMITIVE   Information about current STRUC                      *)
00000000  1  (***********************************************************************)
00000000  1  (* OUTPUTS:                                                         *)
00000000  1  (* IN_STRUC      TRUE  iff DATA_ADDR in current STRUC.              *)
00000000  1  (*               FALSE iff DATA_ADDR not in current STRUC.          *)
00000000  1  (***********************************************************************)
00000000  1  FUNCTION IN_STRUC(DATA_ADDR:INTEGER; RAW:DATAREC_PTR; PRIMITIVE:PRIMITIVE_PTR):BOOLEAN;
00000001  2  VAR J:INT;
00000004  2  TEMP              :INTEGER;      (*TEMPORARY FOR TYPE CHANGING INTGERS*)
00000008  2  CURR_STATUS       :STATUS_TYPE;
0000134C  2  BEGIN WITH PRIMITIVE^ DO BEGIN
00001352  2  SUBTRACT32(DATA_ADDR,STRUC_ADDR,TEMP);
0000136E  2  J:=TEMP[1];
00001374  2  IF RAW^.WRITE_STATUS
00001380  2    THEN CURR_STATUS:=WRITEI
0000138A  2    ELSE CURR_STATUS:=READD;
0000138E  2  IN_STRUC:=FALSE;
00001392  2  IF J>=0
0000139A  2    THEN IF J<PRIMITIVE^.STRUC_SIZE
000013A8  2      THEN IF PRIMITIVE^.STATUS=CURR_STATUS
000013B6  2        THEN IF PRIMITIVE^.USED[J]=0 (*0=FALSE*)
000013C2  2          THEN IN_STRUC:=TRUE;
000013C8  2  END; END;
00000000  1  $PAGE$
00000000  1  $GLOBPROC OFF$
00000000  1  (***********************************************************************)
00000000  1  (********** NEWSOURCELINE *************************************************)
00000000  1  (***********************************************************************)
00000000  1  (* This function determines if a new piece of raw data belongs to the  *)
00000000  1  (* current source line.  If the current source line # is > 0 then      *)
00000000  1  (* the determination is done by comparing the raw data PC with the     *)
00000000  1  (* current line's MIN and MAX.  If the current source line # is <=0    *)
00000000  1  (* then the current soure line is not really a source line but rather  *)
00000000  1  (* an error message.  In this case, GETSOURCE_HOSCAN must be called     *)
00000000  1  (* to determine if the current raw data PC results in the same error   *)
00000000  1  (* message.                                                            *)
00000000  1  (* TSOURCELINE is NOT a pointer because of timing constraints.         *)
00000000  1  (***********************************************************************)
00000000  1  (* INPUTS:                                                             *)
00000000  1  (* SOURCELINE_NO  Current source line number, current primitive.      *)
00000000  1  (*                -2 ==>  "Program execution outside of absolute ..."  *)
00000000  1  (*                -1 ==>  "File not found, file= xxx:comp_db ..."      *)
00000000  1  (*                 0 ==>  "No source line found ..."                   *)
00000000  1  (*                >0 ==>   real source line, not an error mesage      *)
00000000  1  (* RAW         Pointer to footdc data record.                          *)
00000000  1  (* MIN         Min pc for current source line.                         *)
00000000  1  (* MAX         Max pc for current source line.                         *)
00000000  1  (***********************************************************************)
00000000  1  (* OUTPUTS:                                                            *)
00000000  1  (* NEWSOURCELINE TRUE  iff pc in current source line.                  *)
00000000  1  (*               FALSE iff pc not in current source line.              *)
00000000  1  (***********************************************************************)
00000000  1  FUNCTION NEWSOURCELINE(SOURCELINE_NO:INT; RAW:DATAREC_PTR; MIN,MAX:INTEGER):BOOLEAN;
00000001  2  VAR
00000001  2  PC                :INTEGER;
00000006  2  TSOURCELINE       :STRNG;
000000F8  2  TSOURCELINE_NO    :INT;
000000FA  2  TSOURCELINE_PATH  :PATH_TYPE;
0000011C  2  TMIN              :INTEGER;
00000120  2  TMAX              :INTEGER;
00000124  2  ERROR             :INT;
000013D6  2
000013D6  2  BEGIN
000013D6  2  TSOURCELINE.LEN:=0;
000013DA  2  ERROR:=0;
000013DE  2  IF RAW^.PROG_STATUS
000013EA  2     THEN PC:=RAW^.BUSS_ADDR
000013F4  2     ELSE PC:=RAW^.PC;
000013FE  2  IF SOURCELINE_NO>0 THEN
00001406  2    BEGIN (*Current source line is not an error message*)
00001406  2    IF GT(PC,MAX) OR LT(PC,MIN)
00001434  2       THEN NEWSOURCELINE:=TRUE
0000143E  2       ELSE NEWSOURCELINE:=FALSE;
```

```
00001442  2    END  (*Current source line is not an error message*)
00001446  2    ELSE
00001446  2    BEGIN (*Current source line is an error message*)
00001446  2    GETSOURCE2(PC,TSOURCELINE,TSOURCELINE_NO,TSOURCELINE_PATH,TMIN,TMAX,ERROR); (*GET SOURCE LINE, NO SCAN*)
0000146E  2    IF TSOURCELINE_NO<>SOURCELINE_NO
0000147A  2       THEN NEWSOURCELINE:=TRUE
00001484  2       ELSE NEWSOURCELINE:=FALSE;
00001488  2    END;  (*Current source line is an error message*)
00001488  2  END;
00000000  1  $PAGE$
00000000  1  $GLOBPROC OFF$
00000000  1  $IF M68000
00000000  1  (***************************************************************************)
00000000  1  (*********** ADJACENT ******************************************************)
00000000  1  (***************************************************************************)
00000000  1  (* Determine if current footdc state is part of current primitive.        *)
00000000  1  (* This algorighm works for both qued and dequed data.                    *)
00000000  1  (* This version is for SODA. It tries to decide if a line is being        *)
00000000  1  (* repeated, i.e. implicit or explicit looping,this is not done for       *)
00000000  1  (* SPIDER since data will help determine looping and if no data is        *)
00000000  1  (* available SPIDER can not really add information, whereas SODA does    *)
00000000  1  (* have timing information.
00000000  1  (***************************************************************************)
00000000  1  (* INPUTS:                                                                 *)
00000000  1  (* PRIMITIVE    Information about current STRUC.                          *)
00000000  1  (* DATA_ADDR    Address of data byte iff RAW^ is a data cycle.            *)
00000000  1  (* DATA_BYTE    Data byte (used only for BUILD_REF)                       *)
00000000  1  (* RAW          Pointer to footdc data record.                            *)
00000000  1  (* DIRECTION    Direction to move in footdc data.                         *)
00000000  1  (* MIN          Min pc for current source line.                           *)
00000000  1  (* MAX          Max pc for current source line.                           *)
00000000  1  (* FOO          Pointer to node for current data iff data cycle           *)
00000000  1  (* LAST_PC      PC from the last record processed.                        *)
00000000  1  (* LAST_PS      TRUE if last record was program_status.                   *)
00000000  1  (* REPEATED     TRUE if ADJACENT found the line to be repeated            *)
00000000  1  (* ERROR        Error flag from most recent fngr read.                    *)
00000000  1  (***************************************************************************)
00000000  1  (* OUTPUTS:                                                                *)
00000000  1  (* BUILDFLAG    TRUE if data cycle and part of current STRUC.             *)
00000000  1  (* ERROR        Error flag.                                               *)
00000000  1  (* ADJACENT     TRUE if data byte and part of current PRIMITIVE.          *)
00000000  1  (***************************************************************************)
00000000  1  FUNCTION ADJACENT(PRIMITIVE:PRIMITIVE_PTR ;DATA_ADDR:INTEGER; DATA_BYTE:BYTE; RAW:DATAREC_PTR;
00000000  2                    VAR BUILDFLAG:BOOLEAN; DIRECTION:INT; MIN,MAX:INTEGER;VAR FOO:NODE_PTR;LAST_PC:INTEGER;
00000000  2                    LAST_PS:BOOLEAN; VAR REPEATED:BOOLEAN; VAR ERROR:INT):BOOLEAN;
00000000  2  LABEL 1;
00000001  2  VAR
00000001  2  J                    :INT;          (*INDEX INTO STRUC*)
00000004  2  RESULT               :RESULT_TYPE;  (*FOUND,NOTFOUND,REF*)
00000005  2  TEMP_STRUC_ADDR      :INTEGER;      (*ABSOLUTE ADDRESS OF THE STRUCTURE IFF RESULT=FOUND OR REF*)
00001496  2
00001496  2  BEGIN WITH PRIMITIVE^ DO  BEGIN
0000149C  2  ADJACENT:=FALSE;
000014A0  2  BUILDFLAG:=FALSE;
000014A6  2  IF ERROR<>0 THEN GOTO 1;
000014B4  2  IF RAW^.TYP<>STATEMENTS_ THEN GOTO 1;
000014C8  2
000014C8  2  IF (ENVIRONMENT^.PREFETCH) AND (COUNTER<>0) AND (COUNTER<>STRUC_SIZE) THEN
000014F6  2    BEGIN (*Special case: prefetch processor and partialy completed strucure*)
000014F6  2    (* When random states are requested partial values will result in this being *)
000014F6  2    (* called and source lines may be lost if consecutive accesses to this are seen *)
000014F6  2    IF RAW^.PROG_STATUS THEN BEGIN ADJACENT:=TRUE; GOTO 1; END;
0000150C  2    IF IN_STRUC(DATA_ADDR,RAW,PRIMITIVE) THEN BEGIN ADJACENT:=TRUE; BUILDFLAG:=TRUE; GOTO 1; END;
0000153C  2    WHATISIT(DATA_ADDR,RAW,FOO,TEMP_STRUC_ADDR,RESULT,ERROR); (*SETS DB_ARRAY TO POINT TO DATA BASE*)
00001564  2    IF ERROR<>0 THEN GOTO 1;
00001572  2    IF (RESULT=REF) AND (DIRECTION=FWD) THEN BUILD_REF(DATA_ADDR,DATA_BYTE,FOO,TEMP_STRUC_ADDR);
000015AE  2    IF RESULT=FOUND THEN GOTO 1;
000015BA  2    ADJACENT:=TRUE;
000015C0  2    END  (*Special case: prefetch processor and partialy completed strucure*)
000015C4  2
000015C4  2    ELSE
000015C4  2    BEGIN (*Normal case*)
000015C4  2    IF NEWSOURCELINE(SOURCELINE_NO,RAW,MIN,MAX) THEN GOTO 1;
000015EE  2    IF (DIRECTION=FWD) AND (RAW^.PROG_STATUS) THEN
00001604  2      IF LE(RAW^.BUSS_ADDR,LAST_PC) THEN
0000161A  2        BEGIN
```

```
00001618  2        REPEATED := TRUE;
00001622  2        GOTO 1;
00001626  2        END;
00001626  2   IF (DIRECTION=BKWD) AND (LAST_PS) THEN
0000163C  2     BEGIN
0000163C  2     IF RAW^.PROG_STATUS AND GE(RAW^.BUSS_ADDR,LAST_PC) THEN
0000165E  2        BEGIN
0000165E  2        REPEATED := TRUE;
00001666  2        GOTO 1;
0000166A  2        END;
0000166A  2     IF RAW^.DATA_STATUS AND GE(RAW^.PC,LAST_PC) THEN
0000168C  2        BEGIN
0000168C  2        REPEATED := TRUE;
00001694  2        GOTO 1;
00001698  2        END;
00001698  2     END;
00001698  2   IF RAW^.PROG_STATUS THEN BEGIN ADJACENT:=TRUE;  GOTO 1; END;
000016AE  2   IF COUNTER=0 THEN
000016BA  2     BEGIN (*Counter=0*)
000016BA  2     WHATISIT(DATA_ADDR,RAW,FOO,TEMP_STRUC_ADDR,RESULT,ERROR); (*SETS DD_ARRAY TO POINT TO DATA BASE*)
000016E2  2     IF ERROR<>0 THEN  GOTO 1;
000016F0  2     IF (RESULT=REF) AND (DIRECTION=FWD) THEN BUILD_REF(DATA_ADDR,DATA_BYTE,FOO,TEMP_STRUC_ADDR);
0000172C  2     IF RESULT=FOUND THEN
00001734  2       BEGIN ADJACENT:=TRUE; BUILDFLAG:=TRUE; INIT_STRUC(PRIMITIVE,FOO,TEMP_STRUC_ADDR,DATA_ADDR); GOTO 1; END;
00001764  2     ADJACENT:=TRUE; GOTO 1;
0000176E  2     END;  (*Counter=0*)
0000176E  2   IF IN_STRUC(DATA_ADDR,RAW,PRIMITIVE) THEN BEGIN ADJACENT:=TRUE; BUILDFLAG:=TRUE; GOTO 1; END;
0000179E  2   WHATISIT(DATA_ADDR,RAW,FOO,TEMP_STRUC_ADDR,RESULT,ERROR); (*SETS DD_ARRAY TO POINT TO DATA BASE*)
000017C6  2   IF ERROR<>0 THEN  GOTO 1;
000017D4  2   IF (RESULT=REF) AND (DIRECTION=FWD) THEN BUILD_REF(DATA_ADDR,DATA_BYTE,FOO,TEMP_STRUC_ADDR);
00001810  2   IF RESULT=FOUND THEN  GOTO 1;
0000181C  2   ADJACENT:=TRUE;
00001822  2   END;  (*Normal case*)
00001822  2
00001822  2 1:END;END;  (*END WITH, END PROCEDURE*)
00000000  1 #ELSE
00000000  1 (*************************************************************************)
00000000  1 (********** ADJACENT ****************************************************)
00000000  1 (*************************************************************************)
00000000  1 (* Determine if current footdc state is part of current primitive.     *)
00000000  1 (* This algorighm works for both qued and dequed data.                 *)
00000000  1 (*************************************************************************)
00000000  1 (* INPUTS:                                                               *)
00000000  1 (* PRIMITIVE   Information about current STRUC.                          *)
00000000  1 (* DATA_ADDR   Address of data byte iff RAW^ is a data cycle.            *)
00000000  1 (* DATA_BYTE   Data byte (used only for BUILD_REF).                      *)
00000000  1 (* RAW         Pointer to footdc data record.                            *)
00000000  1 (* DIRECTION   Direction to move in footdc data.                         *)
00000000  1 (* MIN         Min pc for current source line.                           *)
00000000  1 (* MAX         Max pc for current source line.                           *)
00000000  1 (* FOO         Pointer to node for current data iff data cycle           *)
00000000  1 (* ERROR       Error flag from most recent fnor read.                    *)
00000000  1 (*************************************************************************)
00000000  1 (* OUTPUTS:                                                              *)
00000000  1 (* BUILDFLAG   TRUE if data cycle and part of current STRUC.             *)
00000000  1 (* ERROR       Error flag.                                               *)
00000000  1 (* ADJACENT    TRUE if data byte and part of current PRIMITIVE.          *)
00000000  1 (*************************************************************************)
00000000  1 FUNCTION ADJACENT(PRIMITIVE:PRIMITIVE_PTR ;DATA_ADDR:INTEGER; DATA_BYTE:BYTE; RAW:DATAREC_PTR;
00000000  1                   VAR BUILDFLAG:BOOLEAN; DIRECTION:INT; MIN,MAX:INTEGER;VAR FOO:NODE_PTR;
00000000  1                   VAR ERROR:INT):BOOLEAN;
00000000  1 LABEL 1;
00000000  1 VAR
00000000  1 J                  :INT;          (*INDEX INTO STRUC*)
00000000  1 RESULT             :RESULT_TYPE;  (*FOUND,NOTFOUND,REF*)
00000000  1 TEMP_STRUC_ADDR    :INTEGER;      (*ABSOLUTE ADDRESS OF THE STRUCTURE IFF RESULT=FOUND OR REF*)
00000000  1
00000000  1 BEGIN WITH PRIMITIVE^ DO  BEGIN
00000000  1 ADJACENT:=FALSE;
00000000  1 BUILDFLAG:=FALSE;
00000000  1 IF ERROR<>0 THEN GOTO 1;
00000000  1 IF RAW^.TYP<>STATEMENTS_ THEN GOTO 1;
00000000  1
00000000  1 IF (ENVIRONMENT^.PREFETCH) AND (COUNTER<>0) AND (COUNTER<>STRUC_SIZE) THEN
00000000  1   BEGIN (*Special case: prefetch processor and partialy completed strucure*)
00000000  1   (* When random states are requested partial values will result in this being *)
00000000  1   (* called and source lines may be lost if consecutive accesses to this are seen *)
```

```
00000000 1     IF RAW^.PROG_STATUS THEN BEGIN ADJACENT:=TRUE; GOTO 1; END;
00000000 1     IF IN_STRUC(DATA_ADDR,RAW,PRIMITIVE) THEN BEGIN ADJACENT:=TRUE; BUILDFLAG:=TRUE; GOTO 1; END;
00000000 1     WHATISIT(DATA_ADDR,RAW,FOO,TEMP_STRUC_ADDR,RESULT,ERROR); (*SETS DB_ARRAY TO POINT TO DATA BASE*)
00000000 1     IF ERROR<>0 THEN GOTO 1;
00000000 1     IF (RESULT=REF) AND (DIRECTION=FWD) THEN BUILD_REF(DATA_ADDR,DATA_BYTE,FOO,TEMP_STRUC_ADDR);
00000000 1     IF RESULT=FOUND THEN GOTO 1;
00000000 1     ADJACENT:=TRUE;
00000000 1     END   (*Special case: prefetch processor and partialy compleced strucure*)
00000000 1
00000000 1     ELSE
00000000 1     BEGIN (*Normal case*)
00000000 1     IF NEWSOURCELINE(SOURCELINE_NO,RAW,MIN,MAX) THEN GOTO 1;
00000000 1     IF RAW^.PROG_STATUS THEN BEGIN ADJACENT:=TRUE;  GOTO 1; END;
00000000 1     IF COUNTER=0 THEN
00000000 1       BEGIN (*Counter=0*)
00000000 1       WHATISIT(DATA_ADDR,RAW,FOO,TEMP_STRUC_ADDR,RESULT,ERROR); (*SETS DB_ARRAY TO POINT TO DATA BASE*)
00000000 1       IF ERROR<>0 THEN  GOTO 1;
00000000 1       IF (RESULT=REF) AND (DIRECTION=FWD) THEN BUILD_REF(DATA_ADDR,DATA_BYTE,FOO,TEMP_STRUC_ADDR);
00000000 1       IF RESULT=FOUND THEN
00000000 1         BEGIN ADJACENT:=TRUE; BUILDFLAG:=TRUE; INIT_STRUC(PRIMITIVE,FOO,TEMP_STRUC_ADDR,DATA_ADDR); GOTO 1; END;
00000000 1       ADJACENT:=TRUE; GOTO 1;
00000000 1       END;  (*Counter=0*)
00000000 1     IF IN_STRUC(DATA_ADDR,RAW,PRIMITIVE) THEN BEGIN ADJACENT:=TRUE; BUILDFLAG:=TRUE; GOTO 1; END;
00000000 1     WHATISIT(DATA_ADDR,RAW,FOO,TEMP_STRUC_ADDR,RESULT,ERROR); (*SETS DB_ARRAY TO POINT TO DATA BASE*)
00000000 1     IF ERROR<>0 THEN  GOTO 1;
00000000 1     IF (RESULT=REF) AND (DIRECTION=FWD) THEN BUILD_REF(DATA_ADDR,DATA_BYTE,FOO,TEMP_STRUC_ADDR);
00000000 1     IF RESULT=FOUND THEN  GOTO 1;
00000000 1     ADJACENT:=TRUE;
00000000 1     END;  (*Normal case*)
00000000 1
00000000 1  1:END;END;  (*END WITH, END PROCEDURE*)
00000000 1  #ENDIF
00000000 1  $PAGE$
00000000 1  $GLOBPROC OFF$
00000000 1  (**************************************************************************)
00000000 1  (********** TRACE STATEMENTS **********************************************)
00000000 1  (**************************************************************************)
00000000 1  (* When constructing statements forward any 'unknown' data from the       *)
00000000 1  (* footdc is included. When going backwards the first position found     *)
00000000 1  (* when building a structure is used as the beginning of the primitive.  *)
00000000 1  (* This is to avoid 'unknown' data from being included in different      *)
00000000 1  (* places depending on the direction of the building of the primitive.   *)
00000000 1  (* This is still not totally accurate when partial data is involved.     *)
00000000 1  (**************************************************************************)
00000000 1  (* INPUTS:                                                                *)
00000000 1  (* CURR          Initial position in foordc.                              *)
00000000 1  (* DIRECTION     Direction to move in footdc data.                        *)
00000000 1  (**************************************************************************)
00000000 1  (* OUTPUTS:                                                               *)
00000000 1  (* PRIMITIVE   Ptr to info needed to fmt display line.                    *)
00000000 1  (* ERROR       0 = PRIMITIVE built as requested.                          *)
00000000 1  (**************************************************************************)
00000000 1  PROCEDURE TRACESTM_ (PRIMITIVE:PRIMITIVE_PTR; DIRECTION:INT;CURR:INT;
00000000 2                      VAR ERROR:INT);
00000000 2  LABEL 1;
00000000 2  VAR
00000000 2  $EXTVAR ON$
00000000 2  $PAR$
00000000 2  MOOO                 :STRNG; (*"non_real time interval"*)
00000000 2  $EXTVAR OFF$
00000000 2
00000000 2  VAR
00000000 2  ADJACENT_FLAG        :BOOLEAN;     (*TRUE IF CURRENT RECORD IS PART OF CURRENT PRIMITIVE*)
00000001 2  DATA_BYTE            :BYTE;        (*DATA BYTE FROM FOOTDC RECORD*)
00000002 2  DATA_ADDR            :INTEGER;     (*DATA ADDRESS FROM FOOTDC*)
00000006 2  SYMBOL_NO            :INT;         (*SYMBOL NUMBER FOR DATA_ADDR,DATA_BYTE*)
00000008 2  BYTE_INDEX           :INT;         (*Index to byte in RAW^.BUSS_ADDDR*)
0000000A 2  J                    :INT;         (*INDEX INTO STRUC*)
0000000C 2  TEMP                 :INTEGER;     (*TEMP FOR TYPE CHANGEING INTEGERS*)
00000010 2  BUILDFLAG            :BOOLEAN;     (*TRUE IF WE SHOULD ADD DATA BYTE TO STRUC*)
00000011 2  FOO                  :NODE_PTR;    (*PTR TO CURRENT NODE OF INTREST*)
00000016 2  RESULT               :RESULT_TYPE; (*RESULT OF CALL TO WHATISIT*)
00000017 2  ABS_STRUC_ADDR       :INTEGER;       (*ABSOLUTE ADDRESS OF THE STRUCTURE IFF RESULT=FOUND OR REF*)
0000001C 2  MIN                  :INTEGER;     (*Min pc for current source line*)
00000020 2  MAX                  :INTEGER;     (*Max pc for current source line*)
00000024 2  PC                   :INTEGER;     (*Program counter of interest*)
00000028 2  BUILT_BKWD           :BOOLEAN;     (*TRUE if BUILDFLAG has been true and direction=BKWD*)
```

```
00000029  2  TEMP_START       :INT;          (*Holds last start when building structure*)
0000002C  2  TEMP_KC9A        :KC9A_TAG;     (*Holds last KC9A when building structure*)
00000034  2  #IF M68000
00000034  2  LAST_PC          :INTEGER;      (*Holds last PC to use in case line is being repeated*)
00000038  2  LAST_PS          :BOOLEAN;      (*TRUE if last record is program_status              *)
00000039  2  REPEATED         :BOOLEAN;      (*TRUE if ADJACENT found the line to be repeated     *)
00001830  2  #ENDIF
00001830  2
00001830  2  BEGIN WITH PRIMITIVE^ DO BEGIN
00001836  2  (***** PRIMING READ *******************************************************)
00001836  2  IF DIRECTION=FWD
0000183E  2    THEN
0000183E  2  #IF M68000
0000183E  2    GO_READFWD (RAW,DATA_BYTE,DATA_ADDR,BYTE_INDEX,SYMBOL_NO,CURR,ERROR)
0000186C  2  #ELSE
0000186C  2    READFWD (RAW,DATA_BYTE,DATA_ADDR,BYTE_INDEX,SYMBOL_NO,CURR,ERROR)
0000186C  2  #ENDIF
0000186C  2    ELSE
0000186C  2  #IF M68000
0000196C  2    GO_READBKWD (RAW,DATA_BYTE,DATA_ADDR,BYTE_INDEX,SYMBOL_NO,CURR,ERROR);
00001896  2  #ELSE
00001896  2    READBKWD (RAW,DATA_BYTE,DATA_ADDR,BYTE_INDEX,SYMBOL_NO,CURR,ERROR);
00001896  2  #ENDIF
00001896  2  IF ERROR<>0 THEN GOTO 1;                              (*IF FMGR ERROR THEN EXIT*)
000018A4  2  KC9A[0] := 0;  (* Initialize to zero in case this is a MESSAGE or FRAME recored *)
000018AE  2  KC9A[1] := 0;
000018BA  2  KC9A[2] := 0;
000018C6  2  KC9A[3] := 0;
000018D2  2  IF DIRECTION=FWD
000018DA  2    THEN ENDING  :=CURR
000018E8  2    ELSE STARTING:=CURR;
000018F2  2  $PAGE$
000018F2  2  CASE RAW^.TYP OF
00001900  2  MESSAGE_:
00001900  2  (********** PROCESS MESSAGE RECORD *****************************************)
00001900  2  BEGIN (*Process Message record*)
00001900  2  PRIMITIVE^.MESSAGE:=TRUE; (*Set special message flag*)
0000190A  2  PRIMITIVE^.SYM.LEN:=(RAW^.LEN-1)*2; (*Word count to byte count, dont count record type word*)
00001920  2  MOVEBYTES(PTR(ADDR(RAW^.LEN)), 4, PTR(ADDR(PRIMITIVE^.SYM.LEN)), 2, SYM.LEN);
00001950  2  END;  (*Process Message record*)
00001954  2  $PAGE$
00001954  2  FRAME_:
00001954  2  (*********** PROCESS FRAME RECORD *****************************************)
00001954  2  BEGIN (*Process frame record*)
00001954  2  PRIMITIVE^.MESSAGE:=TRUE; (*Set special message flag*)
0000195E  2  MOVEBYTES(PTR(ADDR(NOOO)), 0, PTR(ADDR(PRIMITIVE^.SYM)), 0, NOOO LEN+2). (*"Break for new stack information"*)
0000198A  2  END.  (*Process frame record*)
0000198E  2  $PAGE$
0000198E  2  STATEMENTS_:
0000198E  2  (********** PROCESS STATEMENTS RECORD **************************************)
0000198E  2  BEGIN  (*Process statements record*)
0000198E  2  KC9A:=RAW^.KC9A;     (* Get good data *)
000019A2  2  BUILT_BKWD:=FALSE;  (* Initialize to false *)
000019A6  2  PC:=RAW^.PC;  (*This is true iff it is a data cycle, if its program then we will get PC from  BUSS_ADDR*)
000019B0  2  BUILDFLAG:=FALSE; (*Assume the priming read is not found, i.e. not in a structure*)
000019B4  2  IF RAW^.FRAME <> FRAME_REC THEN NEWFRAME(RAW,ERROR); (*New frame, ret w/orig fngr rec in RAW^, new FRONTIER_REC*)
000019D6  2  IF ERROR<>0 THEN GOTO 1;
000019E4  2  IF (PROC_NO<>0) AND (RAW^.REC_NO > FRONTIER_REC) THEN NEWFRONTIER(RAW^.REC_NO,ERROR);(*FRONTIER_REC <-- curr fngr
00001A18  2  IF ERROR<>0 THEN GOTO 1;
00001A26  2  WHATISIT(DATA_ADDR,RAW,FOO,ABS_STRUC_ADDR,RESULT,ERROR);
00001A4C  2  IF ERROR<>0 THEN GOTO 1;
00001A5A  2  CASE RESULT OF
00001A54  2    PRG           :PC:=RAW^.BUSS_ADDR;
00001A72  2    REF           :IF (DIRECTION=FWD) THEN BUILD_REF(DATA_ADDR,DATA_BYTE,FOO,ABS_STRUC_ADDR);
00001A9A  2    FOUND         :BEGIN INIT_STRUC(PRIMITIVE,FOO,ABS_STRUC_ADDR,DATA_ADDR); BUILDFLAG:=TRUE; END;
00001AC0  2    OTHERWISE     ;
00001AC0  2    END; (*END CASE*)
00001AE6  2  GETSOURCE2(PC,SOURCELINE,SOURCELINE_NO,SOURCELINE_PATH,MIN,MAX,ERROR); (*Get source, no scan*)
00001B14  2
00001B14  2  (*Adjacency loop*)
00001B14  2  ADJACENT_FLAG:=TRUE; (*FORCE FIRST ITERATION THROUGH LOOP*)
00001B1A  2  WHILE ADJACENT_FLAG DO
00001B22  2    BEGIN (*Adjacency loop*)
00001B22  2  #IF M68000
00001B22  2  (* ASSUMING FIRST ACCESS MUST BE PROG OR DATA TO INITIALIZE LAST_PC,LAST_PS  *)
00001B22  2    REPEATED := FALSE;
00001B26  2    IF RAW^.PROG_STATUS THEN          (* Save the current PC *)
```

```
00001B32  2      BEGIN
00001B32  2      LAST_PC := RAW^.BUSS_ADDR;
00001B3C  2      LAST_PS := TRUE;
00001B3E  2      END
00001B42  2      ELSE
00001B42  2      BEGIN
00001B42  2      LAST_PS := FALSE;
00001B46  2      LAST_PC := RAW^.PC;
00001B50  2      END;
00001B50  2  #ENDIF
00001B50  2    IF BUILDFLAG THEN
00001B58  2      BEGIN (*BUILD THE STRUCTURE*)
00001B5S  2      SUBTRACT32(DATA_ADDR,STRUC_ADDR,TEMP);
00001B74  2      J:=TEMP[1];
00001B7A  2      STRUC[J]:=DATA_BYTE; (*MOVE ONE BYTE*)
00001B8C  2      USED[J]:=1;                          (*MARK THE BYTE AS USED*)
00001B9E  2      COUNTER:=COUNTER+1;                  (*INC USED COUNT*)
00001BAC  2       IF DIRECTION=BKWD THEN
00001BC3  2       BEGIN    (* SAVE STARTING AND COUNT ONLY IF STRUCTURE BEING BUILT BKWD *)
00001BB8  2        BUILT_BKWD := TRUE;
00001BBE  2        TEMP_START:= CURR;
00001BC4  2        TEMP_KC9A:= KC9A;    (* KC9A *)
00001BD4  2       END;   (* SAVE TEMPS *)
00001BD4  2      END;  (*BUILD THE STRUCTURE*)
00001BD4  2    IF DIRECTION=FWD
00001BDC  2      THEN ENDING:=CURR
00001BEA  2      ELSE
00001BEA  2      BEGIN  (*We always want the time tag and the source line associated with the first  position in the primitive*)
00001BEA  2      STARTING:=CURR;
00001BF4  2      KC9A:=RAW^.KC9A; (*We always want the KC9A associated with the first position in the primitive*)
00001C08  2      IF NEWSOURCELINE(SOURCELINE_NO,RAW,MIN,MAX) THEN  (*Still trying to build a struc but found a new line*)
00001C2E  2        BEGIN  (*Change the PC and source line to that associated with the earliest access to the structure*)
00001C2E  2        IF RAW^.PROG_STATUS
00001C3A  2          THEN PC:=RAW^.BUSS_ADDR
00001C44  2          ELSE PC:=RAW^.PC;
00001C4E  2        GETSOURCE2(PC,SOURCELINE,SOURCELINE_NO,SOURCELINE_PATH,MIN,MAX,ERROR); (*Get source no scan*)
00001C7C  2        END;    (*Change the PC and source line to that associated with the earliest access to the structure*)
00001C7C  2      END;    (*We always want the time tag and the source line associated with the first  position in the primitive*)
00001C7C  2    IF DIRECTION=FWD
00001C84  2      THEN
00001C84  2  #IF M68000
00001C84  2       GO_READFWD (RAW,DATA_BYTE,DATA_ADDR,BYTE_INDEX,SYMBOL_NO,CURR,ERROR)
00001CB2  2  #ELSE
00001CB2  2       READFWD (RAW,DATA_BYTE,DATA_ADDR,BYTE_INDEX,SYMBOL_NO,CURR,ERROR)
00001CB2  2  #ENDIF
00001CB2  2       ELSE
00001CB2  2  #IF M68000
00001CB2  2       GO_READBKWD (RAW,DATA_BYTE,DATA_ADDR,BYTE_INDEX,SYMBOL_NO,CURR,ERROR);
00001CDC  2  #ELSE
00001CDC  2       READBKWD (RAW,DATA_BYTE.DATA_ADDR.BYTE_INDEX.SYMBOL_NO,CURR,ERROR);
00001CDC  2  #ENDIF
00001CDC  2  #IF M68000
00001CDC  2    ADJACENT_FLAG:=ADJACENT(PRIMITIVE,DATA_ADDR,DATA_BYTE,RAW,BUILDFLAG,
00001CDC  2                   DIRECTION,MIN,MAX,FOO,LAST_PC,LAST_PS,REPEATED,ERROR);
00001D22  2  #ELSE
00001D22  2    ADJACENT_FLAG:=ADJACENT(PRIMITIVE,DATA_ADDR,DATA_BYTE,RAW,BUILDFLAG,DIRECTION,MIN,MAX,FOO,ERROR);
00001D22  2  #ENDIF
00001D22  2    END;  (*Adjacency loop*)
00001D26  2  #IF M68000
00001D26  2  IF BUILT_BKWD AND NOT NEWSOURCELINE(SOURCELINE_NO,RAW,MIN,MAX) AND (ERROR<>EOF) AND NOT REPEATED THEN
00001D70  2  #ELSE
00001D70  2  IF BUILT_BKWD AND NOT NEWSOURCELINE(SOURCELINE_NO,RAW,MIN,MAX) AND (ERROR<>EOF) THEN
00001D70  2  #ENDIF
00001D70  2           (* DIRECTION WAS BKWD AND A STRUCTURE WAS BUILT BUT NOT A NEW LINE *)
00001D70  2   BEGIN
00001D70  2    STARTING:= TEMP_START;
00001D7A  2    KC9A:= TEMP_KC9A;    (* KC9A *)
00001D9A  2   END;  (* BUILT A STRUCTURE BACKWARD *)
00001D9A  2  IF ERROR=EOF THEN ERROR:=0; (*IGNORE EOFs IF THERE IS SOMETHING IN PRIMITIVE*)
00001D9E  2  IF (ERROR=0) AND (COUNTER<>0) THEN
00001DBE  2   BEGIN  (* FMT VALUE string since STRUC is not empty *)
00001DBE  2    IF REMEMBR_OVFLW THEN
00001DC6  2     BEGIN  (* There was an overflow caused by the next read *)
00001DC6  2      WHATISIT(OLD_DATADDR,RAW,FOO,STRUC_ADDR,RESULT,ERROR);
00001DEC  2      P:=PTR(GENERIC_INT(ADDR(FOO^.DATABASE)) + OLD_OFFSET);
00001DFE  2     END;(* IF THEN *)
00001DFE  2    FMTVAL(VAL,P,STRUC,USED,COUNTER,PAD);
```

```
00001E26  2  END; (* FMT VALUE *)
00001E26  2  END;  (*Process statements record*)
00001E2A  2  OTHERWISE;
00001E2A  2  END; (*END CASE*)
00001E58  2  $PAGE$
00001E58  2  (***** CONCLUDE ****************************************************************;
00001E58  2  1:
00001E58  2  IF DIRECTION=FWD THEN FRONTIER_REC:=MAXX(FRONTIER_REC,RAW^.REC_NO);(*Have I pushed out the frontier?*)
00001E78  2  END;END;  (*END WITH PRIMITIVE*) (*END PROCEDURE TRACESTM*)
00000000  1  $PAGE$
00000000  1  $GLOBPROC ON$
00000000  1  (***************************************************************************)
00000000  1  (*********** TRACE STATEMENTS (prefetch) ***********************************)
00000000  1  (***************************************************************************)
00000000  1  (* INPUTS:                                                                 *)
00000000  1  (* INITIAL        Initial position in footdc.                              *)
00000000  1  (* DIRECTION      Direction to move in footdc data.                        *)
00000000  1  (* MODE           STMTS_ONLY or STMTS_AND_DATA                             *)
00000000  1  (***************************************************************************)
00000000  1  (* OUTPUTS:                                                                *)
00000000  1  (* PRIMITIVE   Ptr to info needed to fmt display line.                     *)
00000000  1  (* ERROR       0 = PRIMITIVE built as requested.                           *)
00000000  1  (***************************************************************************)
00000000  1  PROCEDURE TRACESTM  (PRIMITIVE:PRIMITIVE_PTR; DIRECTION:INT;INITIAL:INT;
00000000  2                        VAR MODE,ERROR:INT);
00000000  2  VAR
00000000  2  TEMP:PRIMITIVE_PTR;
00001E80  2
00001E80  2  BEGIN
00001E80  2  TRACESTM_(PRIMITIVE,DIRECTION,INITIAL,ERROR);
00001E9E  2  IF (MODE=STMTS_ONLY) AND (ERROR=0) AND (PRIMITIVE^.MESSAGE=FALSE) THEN
00001ED0  2    BEGIN (*KEEP BUILDING NEW PRIMITIVES UNTIL NEW SOURCE STM*)
00001ED0  2    NEW(TEMP);
00001EE2  2    TEMP^:=PRIMITIVE^;  (*Force first time through loop*)
00001EF4  2    WHILE (TEMP^.SOURCELINE_NO=PRIMITIVE^.SOURCELINE_NO) AND (ERROR=0) AND (TEMP^.MESSAGE=FALSE) DO
00001F2C  2      BEGIN
00001F2C  2      IF DIRECTION=FWD THEN
00001F34  2        BEGIN
00001F34  2        PRIMITIVE^.ENDING   :=TEMP^.ENDING; (*TEMP^.ENDING is the current ending position for the super primitive*)
00001F3A  2        INITIAL          :=TEMP^.ENDING; (*Set initial position for getting next sub primitive*)
00001F44  2        END
00001F48  2        ELSE
00001F48  2        BEGIN
00001F48  2        PRIMITIVE^.STARTING :=TEMP^.STARTING;  (*TEMP^.STARTING is the current starting position for the super primiti
00001F56  2        PRIMITIVE^.KC9A     :=TEMP^.KC9A;      (*TEMP^.KC9A     is the current KC9A              for the super primiti
00001F6A  2        INITIAL             :=TEMP^.STARTING;  (*Set intial position for getting next sub primitive*)
00001F74  2        END;
00001F74  2      TEMP^.COUNTER :=0;        (*Initialize new sub primitive*)
00001F7C  2      TEMP^.STARTING:=INITIAL; (*Initialize new sub primitive*)
00001F86  2      TEMP^.ENDING  :=INITIAL; (*Initialize new sub primitive*)
00001F90  2      TRACESTM_(TEMP,DIRECTION,INITIAL,ERROR);
00001FAE  2      END;
00001FB2  2    DISPOSE(TEMP);
00001FC4  2    IF ERROR=EOF THEN ERROR:=0;
00001FD8  2    END;
00001FD8  2  END;.
****WARNING ?? - Symbol: LABEL_1, is duplicated in the asmb_syn file.
****WARNING ?? - Symbol: LABEL_1, is duplicated in the asmb_syn file.
****WARNING ?? - Symbol: LABEL_1, is duplicated in the asmb_syn file.
****WARNING ?? - Symbol: LABEL_1, is duplicated in the asmb_syn file.
****WARNING ?? - Symbol: LABEL_1, is duplicated in the asmb_syn file.
****WARNING ?? - Symbol: LABEL_1, is duplicated in the asmb_syn file.
End of compilation, number of errors=    0
00000000  1  "68000" PREPROCESS
00000000  1  #DEFINE M68000 TRUE
00000000  1  (*****************************************************************************************)
00000000  1  (*********** TRACE DONTCARE **************************************************************)
00000000  1  (*****************************************************************************************)
00000000  1  PROGRAM PTRACEDONT;
00000000  1  $EXTENSIONS ON$
00000000  1  $WIDTH 120$
00000000  1  $LIB_ABS_LONG$
00000000  1  $CALL_ABS_LONG$
00000000  1  #INCLUDE "TYPES:KIP"
00000000  1  $EXTVAR ON$
00000000  1  VAR ENVIRONMENT:ENVIRONMENT_PTR;
00000000  1  $EXTVAR OFF$
00000000  1  (*****************************************************************************)
```

```
00000000  1  (******** LOCAL VARIABLES ********************************************)
00000000  1  (************************************************************************)
00000000  1  VAR
00000000  1  RAW                :DATAREC_PTR;        (*PTR TO FOOTDC RECORD*)
00000004  1
00000004  1  (************************************************************************)
00000004  1  (********** PROCEDURES ***************************************************)
00000004  1  (************************************************************************)
00000004  1  $CALL_ABS_LONG ON$
00000000  1  PROCEDURE OUTIT(LETTER : CHAR; VALUE : INT; BASE : CHAR); EXTERNAL;
00000000  1  $CALL_PC_SHORT ON$
00000000  1  PROCEDURE READFWD    (VAR RAW:DATAREC_PTR; VAR DATA_BYTE:BYTE; VAR DATA_ADDR:INTEGER;
00000000  2                       VAR BYTE_INDEX, SYMBOL_NO:INT; VAR LOC:INT; VAR ERROR:INT); EXTERNAL;
00000000  1  PROCEDURE READBKWD   (VAR RAW:DATAREC_PTR; VAR DATA_BYTE:BYTE; VAR DATA_ADDR:INTEGER;
00000000  2                       VAR BYTE_INDEX, SYMBOL_NO:INT; VAR LOC:INT; VAR ERROR:INT); EXTERNAL;
00000000  1  PROCEDURE GETSOURCE2 (REQ_PC:INTEGER; VAR LINE:STRNG; VAR LINE_NO:INT;
00000000  2                           VAR PATH:PATH_TYPE; VAR MIN,MAX:INTEGER; VAR ERROR:INT); EXTERNAL;
00000000  1  PROCEDURE INITGETSOURCE2;EXTERNAL;
00000000  1  PROCEDURE MOVEBYTES  (SOURCE:PTR; SOURCE_OFFSET:INT; DEST:PTR; DEST_OFFSET:INT; COUNT:INT); EXTERNAL;
00000000  1  FUNCTION  GE             (OP1,OP2:INTEGER):BOOLEAN; EXTERNAL;
00000000  1  FUNCTION  LE             (OP1,OP2:INTEGER):BOOLEAN; EXTERNAL;
00000000  1  $PAGE$
00000000  1
00000000  1  $GLOBPROC ON$
00000000  1
00000000  1  (************************************************************************)
00000000  1  (********** INITIALIZE TRACE DONTCARE ************************************)
00000000  1  (************************************************************************)
00000000  1  PROCEDURE INIT_TRACEDONT;
00000004  2  BEGIN
00000004  2  INITGETSOURCE2;
00000008  2  END;
00000000  1
00000000  1  $GLOBPROC OFF$
00000000  1
00000000  1  (************************************************************************)
00000000  1  (******** ADJACENT *******************************************************)
00000000  1  (************************************************************************)
00000000  1  (* Determine if the next record in the footdc is "part of" the current *)
00000000  1  (* record. "part of" is defined as being a data access, or a program   *)
00000000  1  (* fetch with a pc in the range of the current source line.            *)
00000000  1  (************************************************************************)
00000000  1  (* INPUTS:                                                              *)
00000000  1  (* SOURCELINE_NO  Current source line number, current primitive.       *)
00000000  1  (*                -2 ==>  "Program execution outside of absolute ..."   *)
00000000  1  (*                -1 ==>  "File not found, file= xxx:comp_db ..."       *)
00000000  1  (*                 0 ==>  "No source line found ..."                    *)
00000000  1  (*                >0 ==>   real source line, not an error mesage       *)
00000000  1  (* MIN_PC         The minimum pc for the current source line.          *)
00000000  1  (* MAX_PC         The maximum pc for the current source line.          *)
00000000  1  (* RAW            Pointer to footdc data record.                       *)
00000000  1  (* ERROR          Error flag from most recent fmgr read.               *)
00000000  1  (************************************************************************)
00000000  1  (* OUTPUTS:                                                             *)
00000000  1  (* ADJACENT       TRUE if footdc record is part of current source line. *)
00000000  1  (************************************************************************)
00000000  1  FUNCTION ADJACENT(SOURCELINE_NO:INT;MIN_PC,MAX_PC:INTEGER;RAW:DATAREC_PTR;ERROR:INT):BOOLEAN;
00000010  2  (******************** ADD SOURCELINE_NO AS A PARAMETER ******************)
00000010  2  BEGIN
00000010  2  ADJACENT:=FALSE;
00000014  2  IF ERROR=0 THEN
0000001C  2    IF RAW^.DATA_STATUS THEN        (* Ignore all data *)
00000028  2        ADJACENT:=TRUE
00000032  2     ELSE IF SOURCELINE_NO>0 THEN  (* Current source line is not an error message *)
0000003A  2         IF GE(RAW^.BUSS_ADDR,MIN_PC) AND LE(RAW^.BUSS_ADDR,MAX_PC)
0000006C  2          THEN ADJACENT:=TRUE;
00000072  2  END;
00000000  1  $PAGE$
00000000  1
00000000  1  $GLOBPROC+$
00000000  1  (************************************************************************)
00000000  1  (********** TRACE DONTCARE  **********************************************)
00000000  1  (************************************************************************)
00000000  1  (* INPUTS:                                                              *)
00000000  1  (* REFLINE        Referencing line in BIGBUFF, with info for new line.  *)
00000000  1  (* DIRECTION      Direction to move in footdc data.                     *)
00000000  1  (************************************************************************)
```

```
00000000  1  (* OUTPUTS:                                                    *)
00000000  1  (* PRIMITIVE   Ptr to info needed to fmt display line.         *)
00000000  1  (* ERROR       0 = PRIMITIVE built as requested.               *)
00000000  1  (*****************************************************************)
00000000  1  PROCEDURE TRACEDONT (PRIMITIVE:PRIMITIVE_PTR; DIRECTION:INT; CURR:INT; VAR ERROR:INT);
00000000  2  LABEL 1;
00000000  2  VAR
00000000  2  DATA_ADDR          :INTEGER;    (*DATA ADDRESS FROM FOOTDC*)
00000004  2  DATA_BYTE          :BYTE;       (*NOT USED*)
00000005  2  BYTE_INDEX         :INT;        (*NOT USED*)
00000008  2  SYMBOL_NO          :INT;        (*NOT USED*)
0000000A  2  ADJACENT_FLAG      :BOOLEAN;    (*TRUE IF CURRENT RECORD IS PART OF CURRENT PRIMITIVE*)
0000000B  2  MIN_PC             :INTEGER;
00000010  2  MAX_PC             :INTEGER;
00000014  2  PC                 :INTEGER;
00000080  2
00000080  2  BEGIN WITH PRIMITIVE^ DO BEGIN
00000086  2  (***** PRIMING READ ***********************************************)
00000086  2  REPEAT
00000086  2    IF DIRECTION=FWD
0000008E  2      THEN READFWD (RAW,DATA_BYTE,DATA_ADDR,BYTE_INDEX,SYMBOL_NO,CURR,ERROR)
000000BA  2      ELSE READBKWD(RAW,DATA_BYTE,DATA_ADDR,BYTE_INDEX,SYMBOL_NO,CURR,ERROR);
000000E2  2    IF ERROR<>0 THEN GOTO 1;
000000F0  2    UNTIL RAW^.PROG_STATUS;
000000FA  2  KC9A:=RAW^.KC9A;     (* SET TO ZERO IF THIS IS A MESSAGE *)
0000010A  2  IF DIRECTION=FWD
00000112  2    THEN ENDING  :=CURR
00000120  2    ELSE STARTING:=CURR;
0000012A  2  $PAGE$
0000012A  2
0000012A  2  (**** PROCESS RECORD(S) *******************************************)
0000012A  2  PC := RAW^.BUSS_ADDR ;    (* Always are seeing an opcode fetch *)
00000134  2  $PAGE$
00000134  2  CASE RAW^.TYP OF
00000142  2  MESSAGE_:
00000142  2  (********** PROCESS MESSAGE RECORD **********************************)
00000142  2  BEGIN (*Process message record*)
00000142  2  KC9A[0] := 0;
0000014C  2  KC9A[1] := 0;
00000158  2  KC9A[2] := 0;
00000164  2  KC9A[3] := 0;
00000170  2  PRIMITIVE^.MESSAGE:=TRUE; (*Set special message flag*)
0000017A  2  PRIMITIVE^.SYM.LEN:=(RAW^.LEN-1)*2; (*Word count to byte count, dont count record type word*)
00000190  2  MOVEBYTES(PTR(ADDR(RAW^.LEN)), 4, PTR(ADDR(PRIMITIVE^.SYM.LEN)), 2, SYM.LEN);
000001BE  2  END;  (*Process message record*)
000001C2  2  $PAGE$
000001C2  2  STATEMENTS_:
000001C2  2  (********** PROCESS STATEMENTS RECORD *******************************)
000001C2  2  BEGIN (* Process statements record *)
000001C2  2  GETSOURCE2(PC,SOURCELINE,SOURCELINE_NO,SOURCELINE_PATH,MIN_PC,MAX_PC,ERROR);
000001EE  2  IF ERROR<>0 THEN GOTO 1; (*ERROR will = 0 even if source line not found unless the error is fatal*)
000001FC  2  ADJACENT_FLAG:=TRUE; (*FORCE FIRST ITERATION THROUGH LOOP*)
00000202  2  WHILE ADJACENT_FLAG DO
0000020A  2    BEGIN  (*THE CURRENT DATA IS PART OF THE CURRENT PRIMITIVE*)
0000020A  2    IF DIRECTION=FWD
00000212  2      THEN ENDING:=CURR
00000220  2      ELSE
00000220  2      BEGIN
00000220  2      STARTING:=CURR;
0000022A  2      KC9A:=RAW^.KC9A;
0000023E  2      END;
0000023E  2    IF DIRECTION=FWD
00000246  2      THEN READFWD (RAW,DATA_BYTE,DATA_ADDR,BYTE_INDEX,SYMBOL_NO,CURR,ERROR)  (*ERROR is checked by ADJACENT*)
00000272  2      ELSE READBKWD(RAW,DATA_BYTE,DATA_ADDR,BYTE_INDEX,SYMBOL_NO,CURR,ERROR); (*ERROR is checked by ADJACENT*)
0000029A  2    ADJACENT_FLAG:=ADJACENT(SOURCELINE_NO,MIN_PC,MAX_PC,RAW,ERROR);
000002C2  2    END;  (*THE CURRENT DATA IS PART OF THE CURRENT PRIMITIVE*)
000002C6  2  IF ERROR=EOF THEN ERROR:=0;
000002DA  2  IF ERROR<>0 THEN GOTO 1;
000002E8  2  END;  (*Process statements record *)
000002EC  2  OTHERWISE;
000002EC  2  END; (* END CASE *)
0000031A  2
0000031A  2  (********** CONCLUDE ************************************************)
0000031A  2  1:END;END;. (*END WITH PRIMITIVE*) (*END PROCEDURE TRACEDCNT*)
End of compilation, number of errors=    0
00000000  1  "68000" PREPROCESS
00000000  1  #DEFINE M68000 TRUE
00000000  1  (*******************************************************************************************)
```

```
00000000 1 (********** TIME MODULES ******************************************************************)
00000000 1 (*****************************************************************************************)
00000000 1 PROGRAM PTIMEMOD;
00000000 1 $EXTENSIONS ON$
00000000 1 $WIDTH 120$
00000000 1 $LIB_ABS_LONG$
00000000 1 $CALL_ABS_LONG+$
00000000 1 #INCLUDE "TYPES:KIP"
00000000 1 $EXTVAR ON$
00000000 1 VAR ENVIRONMENT:ENVIRONMENT_PTR;
00000000 1 $EXTVAR OFF$
00000000 1 (*************************************************************************)
00000000 1 (********* LOCAL TYPES ***************************************************)
00000000 1 (*************************************************************************)
00000000 1
00000000 1 (*************************************************************************)
00000000 1 (********* LOCAL VARIABLES ***********************************************)
00000000 1 (*************************************************************************)
00000000 1 VAR
00000000 1
00000000 1 RAW              :DATAREC_PTR;       (*PTR TO FOOTDC RECORD*)
00000000 1
00000000 1 (*************************************************************************)
00000000 1 (*********** PROCEDURES **************************************************)
00000000 1 (*************************************************************************)
00000000 1 PROCEDURE READFWD   (VAR RAW:DATAREC_PTR; VAR DATA_BYTE:BYTE; VAR DATA_ADDR:INTEGER;
00000000 2                      VAR BYTE_INDEX, SYMBOL_NO:INT; VAR LOC:INT; VAR ERROR:INT); EXTERNAL;
00000000 1 PROCEDURE READBKWD  (VAR RAW:DATAREC_PTR; VAR DATA_BYTE:BYTE; VAR DATA_ADDR:INTEGER;
00000000 2                      VAR BYTE_INDEX, SYMBOL_NO:INT; VAR LOC:INT; VAR ERROR:INT); EXTERNAL;
00000000 1 PROCEDURE FMTSYMBOL  (SOURCE,DEST:PTR; OFFSET2:INT; VAR LEN:INT);EXTERNAL;
00000000 1 PROCEDURE MOVEBYTES  (SOURCE:PTR; SOURCE_OFFSET:INT; DEST:PTR; DEST_OFFSET:INT; COUNT:INT); EXTERNAL;
00000000 1 $PAGE$
00000000 1 $GLOBPROC ON$
00000000 1 (*************************************************************************)
00000000 1 (********** INITIALIZE TIME MODULES **************************************)
00000000 1 (*************************************************************************)
00000000 1 PROCEDURE INIT_TIMEMOD;
00000004 2 BEGIN
00000004 2 END;
00000000 1
00000000 1 (*************************************************************************)
00000000 1 (********** TIME MODULES *************************************************)
00000000 1 (*************************************************************************)
00000000 1 (* INPUTS:                                                               *)
00000000 1 (* REFLINE     Referencing line in BIGBUFF, with info for new line.       *)
00000000 1 (* DIRECTION   Direction to move in footdc data.                         *)
00000000 1 (*************************************************************************)
00000000 1 (* OUTPUTS:                                                              *)
00000000 1 (* PRIMITIVE   Ptr to info needed to fmt display line.                   *)
00000000 1 (* ERROR       0 = PRIMITIVE built as requested.                         *)
00000000 1 (*************************************************************************)
00000000 1 PROCEDURE TIMEMOD  (PRIMITIVE:PRIMITIVE_PTR; DIRECTION:INT; CURR:INT; VAR ERROR:INT);
00000000 2 LABEL 1;
00000000 2 VAR
00000000 2 DATA_ADDR        :INTEGER;     (*DATA ADDRESS FROM FOOTDC*)
00000004 2 DATA_BYTE        :BYTE;        (*NOT USED*)
00000005 2 BYTE_INDEX       :INT;         (*NOT USED*)
00000008 2 SYMBOL_NO        :INT;         (*NOT USED*)
0000000A 2 SOURCE           :PTR;
0000000E 2 DEST             :PTR;
00000012 2 SYMBOL           :SYMBOLPTR;
0000000C 2
0000000C 2 BEGIN WITH PRIMITIVE^ DO BEGIN
00000012 2 (***** PRIMING READ ******************************************************)
00000012 2 IF DIRECTION=FWD
0000001A 2   THEN READFWD (RAW,DATA_BYTE,DATA_ADDR,BYTE_INDEX,SYMBOL_NO,CURR,ERROR)
00000048 2   ELSE READBKWD(RAW,DATA_BYTE,DATA_ADDR,BYTE_INDEX,SYMBOL_NO,CURR,ERROR);
00000072 2 IF ERROR<>0 THEN GOTO 1;
00000080 2 KC9A:=RAW^.MEAN_KC9A;
00000094 2 KC9A_MIN:=RAW^.MIN_KC9A;
000000A8 2 KC9A_MAX:=RAW^.MAX_KC9A;
000000BC 2 KC9A_COUNT:=RAW^.NUM;
000000CA 2 IF DIRECTION=FWD
000000D2 2   THEN ENDING  :=CURR
000000E0 2   ELSE STARTING:=CURR;
000000EA 2 $PAGE$
000000EA 2
000000EA 2 CASE RAW^.TYP OF
```

```
000000F8  2  MESSAGE_:
000000F8  2  (********** PROCESS MESSAGE RECORD ********************************************)
000000F8  2  BEGIN (*Process message record*)
000000F8  2  PRIMITIVE^.MESSAGE:=TRUE; (*Set special message flag*)
00000102  2  PRIMITIVE^.SYM.LEN:=(RAW^.LEN-1)*2; (*Word count to byte count, dont count record type word*)
00000118  2  MOVEBYTES(PTR(ADDR(RAW^.LEN)), 4, PTR(ADDR(PRIMITIVE^.SYM.LEN)), 2, SYM.LEN);
00000148  2  END;  (*Process message record*)
0000014C  2  $PAGE$
0000014C  2
0000014C  2  TIME_:
0000014C  2  (**** PROCESS RECORD(S) **************************************************)
0000014C  2  BEGIN (*Process variable reocrds*)
0000014C  2  SYMBOL        :=ENVIRONMENT^.SYMBOL_TABLE[RAW^.SY]; (*POINT TO THE SYMBOLREC OF INTREST*)
00000164  2  SOURCE:=PTR(ADDR(SYMBOL^.PATH.PROC_NAME));
00000170  2  DEST  :=PTR(ADDR(SYM.ASCII));
0000017C  2  FMTSYMBOL(SOURCE,DEST,0,SYM.LEN);
00000196  2  SYM_PATH:=SYMBOL^.PATH; (*SOURCEFILE_NAME[0] = 0 if the sourcefile was not found*)
000001AA  2  END;  (*Process variable reocrds*)
000001AE  2
000001AE  2  OTHERWISE;
000001AE  2  END; (*END CASE*)
000001C2  2  $PAGE$
000001C2  2
000001C2  2  (********** CONCLUDE *********************************)
000001C2  2  1:END;END;  (*END WITH PRIMITIVE*) (*END PROCEDURE TIMEMOD*)
End of compilation, number of errors=    0
00000000  1  "68000" PREPROCESS
00000000  1  #DEFINE M68000 TRUE
00000000  1  (******************************************************************************************)
00000000  1  (**********  COUNT STATEMENTS *****************************************************************)
00000000  1  (******************************************************************************************)
00000000  1  PROGRAM PCOUNTSTM;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1  $EXTVAR ON$
00000000  1  VAR ENVIRONMENT:ENVIRONMENT_PTR;
00000000  1  $EXTVAR OFF$
00000000  1  (*************************************************************************)
00000000  1  (******** LOCAL TYPES ******************************************************)
00000000  1  (*************************************************************************)
00000000  1
00000000  1  (*************************************************************************)
00000000  1  (******** LOCAL VARIABLES **************************************************)
00000000  1  (*************************************************************************)
00000000  1  VAR
00000000  1
00000000  1  RAW              :DATAREC_PTR;        (*PTR TO FOOTDC RECORD*)
00000004  1  SOURCEFILE_NO    :INT;        (*DATABASE SOURCE FILE NUMBER*)
00000000  1
00000000  1  (*************************************************************************)
00000000  1  (********** PROCEDURES *****************************************************)
00000000  1  (*************************************************************************)
00000000  1  PROCEDURE OUTIT(LETTER : CHAR; VALUE : INT; BASE : CHAR); EXTERNAL;
00000000  1  PROCEDURE READFWD    (VAR RAW:DATAREC_PTR; VAR DATA_BYTE:BYTE; VAR DATA_ADDR:INTEGER;
00000000  2                       VAR BYTE_INDEX, SYMBOL_NO:INT; VAR LOC:INT; VAR ERROR:INT); EXTERNAL;
00000000  1  PROCEDURE READBKWD   (VAR RAW:DATAREC_PTR; VAR DATA_BYTE:BYTE; VAR DATA_ADDR:INTEGER;
00000000  2                       VAR BYTE_INDEX, SYMBOL_NO:INT; VAR LOC:INT; VAR ERROR:INT); EXTERNAL;
00000000  1  PROCEDURE PROG_INIT      (SOURCE_NAME:PTR; VAR SOURCE_DISC:INT;
00000000  2                           VAR SOURCE_NO,PROCESSOR,LANGUAGE,ERROR:INT); EXTERNAL;
00000000  1  PROCEDURE SCLN_FETCH      (PROGNO:INT; LINENO:INT; STRINGPTR:PTR;
00000000  2                            VAR SIZE,ERROR:INT); EXTERNAL;
00000000  1  PROCEDURE MOVEBYTES  (SOURCE:PTR; SOURCE_OFFSET:INT; DEST:PTR; DEST_OFFSET:INT; COUNT:INT); EXTERNAL;
00000000  1  PROCEDURE FMT_FILENOTFOUND (VAR FILENAME:FNGRNAME; DISC:INT; VAR S:STRNG); EXTERNAL;
00000000  1  PROCEDURE STATUS_LINE      (P:STRNG_PTR;CODE:INT;POSITION:INT); EXTERNAL;
00000000  1  $PAGE$
00000000  1
00000000  1  $GLOBPROC ON$
00000000  1
00000000  1  (*************************************************************************)
00000000  1  (********** INITIALIZE COUNT STATEMENTS ************************************)
00000000  1  (*************************************************************************)
00000000  1  PROCEDURE INIT_COUNTSTM(VAR ERROR:INT);
00000000  2  VAR
00000000  2     PROCESSOR : INT;
00000002  2     LANGUAGE : INT;
```

```
00000004  2      DEST :STRNG_PTR;
00000004  2  BEGIN
00000004  2  WITH ENVIRONMENT^.SYMBOL_TABLE[0]^ DO
00000010  2  PROG_INIT(PTR(ADDR(PATH.SOURCEFILE_NAME)),PATH.SOURCEFILE_DISC,SOURCEFILE_NO,ENVIRONMENT^.PROCESSOR,LANGUAGE,ERROR);
00000038  2  IF ERROR<>0 THEN
00000042  2    BEGIN (*PROG_INIT error*)
00000042  2    IF ERROR=NOT_FOUND THEN
00000050  2      BEGIN  (* "File not found, file=xxx:comp_db " *)
00000050  2      NEW(DEST);
00000062  2      WITH ENVIRONMENT^.SYMBOL_TABLE[0]^ DO
0000006E  2        FNT_FILENOTFOUND(PATH.SOURCEFILE_NAME,PATH.SOURCEFILE_DISC,DEST^);
0000008A  2      STATUS_LINE(DEST,0C000H,-1); (*Output error to status line, clear on next keystroke*)
0000009E  2      DISPOSE(DEST);
000000B0  2      END;   (* "File not found, file=xxx:comp_db " *)
000000B0  2    END;  (*PROG_INIT error*)
000000B0  2  END;
00000000  1
00000000  1  (*************************************************************************)
00000000  1  (********** COUNT STATEMENTS **********************************************)
00000000  1  (*************************************************************************)
00000000  1  (* INPUTS:                                                               *)
00000000  1  (* REFLINE     Referencing line in BIGBUFF, with info for new line.      *)
00000000  1  (* DIRECTION   Direction to move in footdc data.                         *)
00000000  1  (*************************************************************************)
00000000  1  (* OUTPUTS:                                                              *)
00000000  1  (* PRIMITIVE   Ptr to info needed to fnt display line.                   *)
00000000  1  (* ERROR       0 = PRIMITIVE built as requested.                         *)
00000000  1  (*************************************************************************)
00000000  1  PROCEDURE COUNTSTM  (PRIMITIVE:PRIMITIVE_PTR; DIRECTION:INT; CURR:INT; VAR ERROR:INT);
00000000  2  LABEL 1;
00000000  2  VAR
00000000  2  DATA_ADDR         :INTEGER;    (*DATA ADDRESS FROM FOOTDC*)
00000004  2  BYTE_INDEX        :INT;        (*NOT USED*)
00000006  2  DATA_BYTE         :BYTE;       (*NOT USED*)
00000007  2  SYMBOL_NO         :INT;        (*NOT USED*)
0000000A  2  SIZE              :INT;        (*SOURCE LINE SIZE*)
0000000C  2  SYMBOL            :SYMBOLPTR;
000000B8  2
000000B8  2  BEGIN WITH PRIMITIVE^ DO BEGIN
000000BE  2  (***** PRIMING READ ******************************************************)
000000BE  2  IF DIRECTION=FWD
000000C6  2    THEN READFWD (RAW,DATA_BYTE,DATA_ADDR,BYTE_INDEX,SYMBOL_NO,CURR,ERROR)
000000F4  2    ELSE READBKWD(RAW,DATA_BYTE,DATA_ADDR,BYTE_INDEX,SYMBOL_NO,CURR,ERROR);
0000011E  2  IF ERROR<>0 THEN GOTO 1;
0000012C  2  KC9A:=RAW^.CNT;
00000140  2  IF DIRECTION=FWD
00000148  2    THEN ENDING  :=CURR
00000156  2    ELSE STARTING:=CURR;
00000160  2  $PAGE$
00000160  2
00000160  2  CASE RAW^.TYP OF
0000016E  2  MESSAGE_:
0000016E  2  (********** PROCESS MESSAGE RECORD ***************************************)
0000016E  2  BEGIN (*Process message record*)
0000016E  2  PRIMITIVE^.MESSAGE:=TRUE; (*Set special message flag*)
00000178  2  PRIMITIVE^.SYM.LEN:=(RAW^.LEN-1)*2; (*Word count to byte count, dont count record type word*)
0000018E  2  MOVEBYTES(PTR(ADDR(RAW^.LEN)), 4, PTR(ADDR(PRIMITIVE^.SYM.LEN)), 2, SYM.LEN);
000001BE  2  END;  (*Process message record*)
000001C2  2  $PAGE$
000001C2  2
000001C2  2  COUNT_:
000001C2  2  (**** PROCESS RECORD(S) **************************************************)
000001C2  2  BEGIN (*Process variable records*)
000001C2  2  SYMBOL         :=ENVIRONMENT^.SYMBOL_TABLE[0]; (*POINT TO THE SYMBOLREC OF INTREST*)
000001CE  2  SOURCELINE_NO :=RAW^.LINE;
000001DC  2  SOURCELINE_PATH:= SYMBOL^.PATH;
000001F0  2  SCLN_FETCH(SOURCEFILE_NO,SOURCELINE_NO,PTR(ADDR(SOURCELINE.ASCII)),SIZE,ERROR);
00000218  2  IF ERROR<>0 THEN
00000222  2    BEGIN (*SCLN_FETCH error*)
00000222  2    IF ERROR=NOT_FOUND THEN
00000230  2      BEGIN
00000230  2      SOURCELINE_NO:=0; (*0==> NO SOURCE LINE FOUND*)
00000238  2      ERROR:=0;
0000023E  2      END;
0000023E  2    GOTO 1;
00000242  2    END;  (*SCLN_FETCH error*)
00000242  2  SOURCELINE.LEN := SIZE;
0000024C  2  END;  (*Process variable reocrds*)
```

```
00000250  2
00000250  2  OTHERWISE;
00000250  2  END; (*END CASE*)
00000266  2  SPACE
00000266  2
00000266  2  (********** CONCLUDE **********************************************************)
00000266  2  1:END;END;. (*END WITH PRIMITIVE*) (*END PROCEDURE COUNTSTM*)
End of compilation, number of errors=    0
00000000  1  "68000" PREPROCESS
00000000  1  #DEFINE M68000 TRUE
00000000  1  (******************************************************************************)
00000000  1  (**********  FOOTDC  (all footdc fngr operations) ****************************)
00000000  1  (******************************************************************************)
00000000  1  (* Routines for initalizing and accsessing data from the hardware unloader.     *)
00000000  1  (* This data currently comes from the FOOTDC although it may come directly from the  *)
00000000  1  (* Acquisition memory.  Footdc errors are handled locally.                      *)
00000000  1  (******************************************************************************)
00000000  1  PROGRAM PFOOTDC;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"        (*ALL TYPE DEFINITIONS*)
00000000  1  $EXTVAR ON$
00000000  1  VAR
00000000  1  ENVIRONMENT:ENVIRONMENT_PTR;
00000000  1  $EXTVAR OFF$
00000000  1  SPACE$
00000000  1  (******************************************************************************)
00000000  1  (**********  LOCAL STATICS & TYPES ******************************************)
00000000  1  (******************************************************************************)
00000000  1  CONST
00000000  1  #IF M68000
00000000  1  NON_FNGR=5;      (*Number of words in a DATAREC that are not fngr words*)
00000000  1  #ELSE
00000000  1  NON_FNGR=8;
00000000  1  #ENDIF
00000000  1  MAXIBUFF=NON_FNGR+130-1;  (*Upper bound on buffer for constructing DATAREC*)
00000000  1
00000000  1  TYPE
00000000  1  RECORD_TYPE       =(LSBYTE, MSBYTE, WORD01, WORD10, OTHER);
00000000  1  BUFFER_TYPE       =ARRAY[0..MAXIBUFF] OF INT;
00000000  1  BUFFER_PTR        =^BUFFER_TYPE;
00000000  1
00000000  1  VAR
00000000  1  CURR_FNGR_POS     :INT;      (*FNGR RECORD NUMBER OF NEXT RECORD TO BE READ IN FWD DIRECTION*)
00000002  1  CURR_REC          :INT;      (*FNGR RECORD NUMBER OF RECORD CURRENTLY IN IBUFF*)
00000004  1  IBUFF             :BUFFER_PTR;(*POINTS TO FOOTDC FNGR RECORD WITH RECORD NUMBER*)
00000008  1  #IF NOT M68000
00000008  1  $EXTVAR ON$          (*USE TOM'S DCB*)
00000008  1  #ENDIF
00000008  1  FOOTDC_DCB          :DCB_TYPE;
0000000A  1  $EXTVAR OFF$
0000000A  1
0000000A  1  (**********************************************************************************************)
0000000A  1  (* IBUFF really pts to array [0..MAXIBUFF] as declared.  It is passed to P_READ & P_READBACKWARD    *)
0000000A  1  (* as an INT to fix a bug on 68000 when type changing arrays.                                    *)
0000000A  1  (**********************************************************************************************)
0000000A  1  (*    IBUFF       RAW                                                                           *)
0000000A  1  (* |--------|  |--------|                                                                      *)
0000000A  1  (* | PTS TO |  | PTS TO |   READ FORWARD                                                       *)
0000000A  1  (* | WORD 0 |  | WORD 0 |                                                                      *)
0000000A  1  (* |________|  |________|                                                                      *)
0000000A  1  (*      |           |                                                                          *)
0000000A  1  (*      |           0                                                              MAXIBUFF    *)
0000000A  1  (*      |          |-----------------|-------|---------------------/ /---------|---------------|---------|  *)
0000000A  1  (*      |__________| non fngr        | length| fngr-record         / /         | extra, if any | unused  |  *)
0000000A  1  (*                 | 68000= 5 words  | word  | (max 128 words      / /         |               | length  |  *)
0000000A  1  (*                 | BPC=   8 words  |       |                     / /         |               | word    |  *)
0000000A  1  (*                 |_________________|_______|_____________________/ /_________|_______________|_________|  *)
0000000A  1  (*                                                                                             *)
0000000A  1  (*   IBUFF                    RAW                                                              *)
0000000A  1  (* |--------|               |--------|                                                         *)
0000000A  1  (* | PTS TO |               | PTS TO |   READBACKWARD                                          *)
0000000A  1  (* | WORD 0 |               | WORD N |                                                         *)
0000000A  1  (* |________|               |________|                                                         *)
0000000A  1  (*      |                        |                                                             *)
```

```
0000000A 1 (*       |        0          |                                                            MAXIBUFF          *)
0000000A 1 (*       |       |-----------------|------------------|-------|---------------------/  /-------|---------|  *)
0000000A 1 (*       |_______| extra (if any) | non fngr          | length| fngr-record         /  /        | used     |  *)
0000000A 1 (*               |                 | 68000= 5 words    | word  | (max 128 words)     /  /        | length   |  *)
0000000A 1 (*               |                 | BPC=   8 words    |       |                     /  /        | word     |  *)
0000000A 1 (*               |_________________|___________________|_______|_____________________/  /________|__________|  *)
0000000A 1 (**********************************************************************************************************)
0000000A 1 $PAGE$
00000000 1 #IF M68000
00000000 1 #DEFINE POSITION M_POSITION
00000000 1 #DEFINE OPEN M_OPEN
00000000 1 #DEFINE READ M_READ
00000000 1 #DEFINE READBACKWARD M_READBACKWARD
00000000 1 #DEFINE READRECNUM  M_READRECNUM
00000000 1 PROCEDURE READRECNUM (VAR FOOTDC_DCB:DCB_TYPE; VAR REC_NO:INT; VAR ERROR:INT); EXTERNAL;
00000000 1 #ELSE
00000000 1 #DEFINE POSITION P_POSITION
00000000 1 #DEFINE OPEN P_OPEN
00000000 1 #DEFINE READ P_READ
00000000 1 #DEFINE READBACKWARD P_READBACKWARD
00000000 1 #ENDIF
00000000 1
00000000 1 PROCEDURE P_FILE_ERR   (VAR DCB:DCB_TYPE; ERROR:INT);EXTERNAL;
00000000 1 PROCEDURE P_ADDR       (INPUT:INTEGER; VAR OUTPUT:INTEGER);EXTERNAL;
00000000 1 PROCEDURE NEW_IT       (SIZE:INT; VAR P:PTR); EXTERNAL;
00000000 1 PROCEDURE ADD32        (OP1,OP2:INTEGER; VAR RESULT:INTEGER);EXTERNAL;
00000000 1 PROCEDURE EXTEND       (OP1:INT; VAR RESULT:INTEGER);EXTERNAL;
00000000 1 PROCEDURE POSITION     (VAR DCB:DCB_TYPE; RECN:INT; VAR ERROR:INT);EXTERNAL;
00000000 1 PROCEDURE OPEN         (VAR NAME:FNGRNAME;FTYPE,DISC:INT; VAR DCB:DCB_TYPE;DCBSIZE:INT;VAR ERROR:INT);EXTERNAL;
00000000 1 PROCEDURE READ         (VAR DCB:DCB_TYPE; VAR IBUFF:INT; LENGTH:INT; VAR ERROR:INT);EXTERNAL;
00000000 1 PROCEDURE READBACKWARD (VAR DCB:DCB_TYPE; VAR IBUFF:INT; LENGTH:INT; VAR ERROR:INT);EXTERNAL;
0000000A 1 $PAGE$
0000000A 1 $GLOBPROC ON$
00000000 1 (*****************************************************************************************)
00000000 1 (*********** LOGICAL TO PHYSICAL ***********************************************************)
00000000 1 (*****************************************************************************************)
00000000 1 PROCEDURE LOGICAL_TO_PHYS(LOGICAL:INTEGER; VAR PHYSICAL:INTEGER);
00000000 2 VAR TEMP:INTEGER;
00000004 2 BEGIN
00000004 2 #IF M68000
00000004 2   P_ADDR(LOGICAL,PHYSICAL);
00000016 2 #ELSE
00000016 2   TEMP[0]:=LOGICAL[1];
00000016 2   TEMP[1]:=LOGICAL[0];
00000016 2   P_ADDR(TEMP,TEMP);
00000016 2   PHYSICAL[1]:=TEMP[0];
00000016 2   PHYSICAL[0]:=TEMP[1];
00000016 2 #ENDIF
00000016 2 END;
00000000 1 $PAGE$
00000000 1 $GLOBPROC ON$
00000000 1 (*****************************************************************************************)
00000000 1 (*********** INIT_ENVIRONMENT **************************************************************)
00000000 1 (*****************************************************************************************)
00000000 1 (* INPUT:                                                                                *)
00000000 1 (* FOOTDC                                                                                *)
00000000 1 (*****************************************************************************************)
00000000 1 (* OUTPUT:                                                                               *)
00000000 1 (* ENVIRONMENT     Record of all sorts of unchanging data from footdc header records    *)
00000000 1 (* ERROR           Display system error code.                                            *)
00000000 1 (*****************************************************************************************)
00000000 1 PROCEDURE INIT_ENVIRONMENT(VAR ERROR:INT);
00000000 2 LABEL 1;
00000000 2 CONST
00000000 2 REC1_LEN  = 8;       (*NO OF WORDS OF DATA IN FIRST RECORD OF FOOTDC*)
00000000 2 REC3_LEN  =11;       (*NO OF WORDS OF DATA IN THIRD RECORD OF FOOTDC*)
00000000 2 FIXED_SIZE=19;       (*NO OF WORDS OF FIXED SIZE INFORMATION IN A SYMBOL RECORD*)
00000000 2 TYPE
00000000 2 SYMBOL_HEADER_TYPE=RECORD
00000000 3   LEN1              :INT;
00000000 3   SOURCEFILE_NAME   :FNGRNAME;
00000000 3   SOURCEFILE_DISC   :INT;
00000000 3   LANGUAGE          :INT;
00000000 3   PROC_NAME         :FNGRNAME;
00000000 3   DB_LENGTH         :INT;              (*NO OF WORDS OF DATA BASE INFOR TO FOLLOW*)
00000000 2   END;
00000000 2 VAR
00000000 2 #IF M68000
```

```
00000000  2  FOOTDC_NAME           :FNGRNAME;  (*FNGR FILE NAME FOR FOOTDC FILE*)
00000010  2  #ELSE
00000010  2  $EXTVAR ONS
00000010  2  FOOTDC_NAME           :FNGRNAME;  (*FNGR FILE NAME FOR FOOTDC FILE*)
00000010  2  $EXTVAR OFFS
00000010  2  #ENDIF
00000010  2  I                     :INT;
00000012  2  J                     :INT;
00000014  2  K                     :INT;
00000016  2  SYMBOL_HEADER         :SYMBOL_HEADER_TYPE;
0000003E  2  DEST                  :STRNG_PTR; (*For formatting status line error message for PROG_INIT*)
00000042  2  SOURCEFILE_NO         :INT;       (*Dummy paramater for call to PROG_INIT*)
0000001E  2
0000001E  2  BEGIN WITH ENVIRONMENT^ DO BEGIN
00000024  2  DCB:=DCB_PTR(ADDR(FOOTDC_DCB)); (*SAVE POINTER TO FOOTDC FOR ERROR FORMATTING*)
00000030  2  NEW(IBUFF);
00000042  2  OPEN(FOOTDC_NAME,8,-1,FOOTDC_DCB,4,ERROR);
00000068  2  IF ERROR<>0 THEN GOTO 1;
00000076  2  READ(FOOTDC_DCB,INT(ENVIRONMENT^.LEN1), REC1_LEN,ERROR); (*READ footdc HEADER RECORD*)
00000096  2  READ(FOOTDC_DCB,INT(IBUFF^[0]),       128     ,ERROR); (*READ COMMAND RECORD*)
000000B6  2  READ(FOOTDC_DCB,INT(ENVIRONMENT^.LEN2), REC3_LEN,ERROR); (*READ CONFIG RECORD*)
000000D8  2  IF ERROR<>0 THEN GOTO 1;     (*READ CONFIG RECORD*)
000000E6  2  CURR_FNGR_POS:=4; (*NEXT REC IN FWD DIRECTION=4*)
000000EC  2  PREFETCH  :=TRUE;
000000F6  2  CASE ENVIRONMENT^.EMUL_ID OF
00000104  2   (* INTEL SET TO TRUE CAUSES DISPLAY TO 'FIX_INTEL_DATA' (BYTE BACK) *)
00000104  2   (*                              AND TO USE SEGMENT REG. IN BUILD_REF (TRACESTM)*)
00000104  2   (* DEFAULT IS PREFETCH=TRUE AND INTEL=FALSE *)
00000104  2    (*8086*) 00F0H: INTEL:=TRUE;
00000112  2    (*8088*) 00F8H: INTEL:=TRUE;
00000120  2    (*80186*) 0032H,0050H:BEGIN
00000120  2                   INTEL:=TRUE;
0000012A  2                   PREFETCH:=FALSE;
00000132  2                   END;
00000136  2    (*80188*) 0033H,0051H:BEGIN
00000136  2                   INTEL:=TRUE;
00000140  2                   PREFETCH:=FALSE;
00000148  2                   END;
0000014C  2    OTHERWISE      INTEL:=FALSE;
00000154  2    END; (*CASE*)
0000017E  2  FOR J:=0 TO ENVIRONMENT^.NO_OF_SYMS-1 DO
00000198  2    BEGIN  (*PROCESS NEXT SYMBOL*)
00000198  2    READ(FOOTDC_DCB,INT(SYMBOL_HEADER.LEN1),20,ERROR);
000001B6  2    IF ERROR<>0 THEN GOTO 1;
000001C4  2    CURR_FNGR_POS:=CURR_FNGR_POS+1;
000001C8  2    NEW_IT(FIXED_SIZE+SYMBOL_HEADER.DB_LENGTH, PTR(SYMBOL_TABLE[J])); (*Allocate variable sized node*)
000001EC  2    WITH SYMBOL_TABLE[J]^ DO
00000200  2      BEGIN (*WITH SYMBOL_TABLE[J]^ *)
00000200  2      PATH.SOURCEFILE_NAME  :=SYMBOL_HEADER.SOURCEFILE_NAME;
00000210  2      PATH.SOURCEFILE_DISC  :=SYMBOL_HEADER.SOURCEFILE_DISC;
0000021A  2      PATH.PROC_NAME        :=SYMBOL_HEADER.PROC_NAME;
0000022E  2      DB_LENGTH             :=SYMBOL_HEADER.DB_LENGTH;
00000238  2      LANGUAGE              :=SYMBOL_HEADER.LANGUAGE;
00000242  2      (*READ THE DATA RECORDS FOR THE CURRENT SYMBOL*)
00000242  2      K:=0;  (*INDEX TO FIRST WORD OF DATA BASE*)
00000246  2      IBUFF^[1]:=0; (*INITIALIZE LENGTH WORD*)
0000024E  2      WHILE K < DB_LENGTH DO
0000025E  2        BEGIN
0000025E  2        READ(FOOTDC_DCB,INT(IBUFF^[1]),128,ERROR);
00000280  2        IF ERROR<>0 THEN GOTO 1;
0000028E  2        CURR_FNGR_POS:=CURR_FNGR_POS+1;
00000292  2        FOR I:=2 TO IBUFF^[1]+1 DO DATABASE.GENERIC[K+I-2]:=IBUFF^[I];
000002E4  2        K:=K+IBUFF^[1];
000002F0  2        END;
000002F4  2      IF DB_LENGTH>0  (*If there is data base information*)
00000300  2        THEN IF SHIFT(SHIFT(DATABASE.WORD1,8),-8)=VARIABLE_  (*And it is a variable*)
00000310  2          THEN IF SHIFT(SHIFT(DATABASE.FLAGS,12),-15) = 0   (*And it is a static*)
00000326  2            THEN LOGICAL_TO_PHYS(DATABASE.ADDRESS, DATABASE.ADDRESS); (*Convert logical to physical*)
00000336  2      END;   (*WITH SYMBOL_TABLE[J]^*)
00000336  2    END;   (*PROCESS NEXT SYMBOL*)
0000034A  2  FIRST_DATA_REC:=CURR_FNGR_POS;
00000354  2  LAST_POSITION := 0;       (* INITIALIZE TO 0 FIRST EOF WILL SET IT CORRECTLY *)
0000035C  2  CURR_REC:=CURR_FNGR_POS-1;
00000366  2  END;  (*END WITH ENVIRONMENT*)
00000366  2  1:IF ERROR<>0 THEN P_FILE_ERR(ENVIRONMENT^.DCB^,ERROR); (*Any footdc fngr error in INITFOOTDC is fatal*)
00000388  2  END; (*END PROCEDURE*)
00000000  1  $PAGES
00000000  1  $GLOBPROC ONS
00000000  1  (*************************************************************************************)
```

```
00000000  1  (********** GET_REC_NUM ******************************************************)
00000000  1  (*****************************************************************************)
00000000  1  (* Get current fngr record number from dcb. Dcb not found is the only possible   *)
00000000  1  (* error from the call to P_READRECNUM.  It is ignored, the assumption being    *)
00000000  1  (* that it will occure and be handled next time a read is done.                 *)
00000000  1  (*****************************************************************************)
00000000  1  (* OUTPUTS:                                                                    *)
00000000  1  (* REC_NO         Record number of last data record in footdc.                 *)
00000000  1  (*****************************************************************************)
00000000  1  PROCEDURE GET_REC_NUM(VAR REC_NO:INT);
00000000  2  VAR ERROR:INT;
00000390  2  BEGIN
00000390  2  #IF M68000
00000390  2  READRECNUM(FOOTDC_DCB,REC_NO,ERROR);
000003AA  2  #ELSE
000003AA  2  REC_NO:=FOOTDC_DCB[13];
000003AA  2  #ENDIF
000003AA  2  END;
00000000  1  $PAGE$
00000000  1  $GLOBPROC OFF$
00000000  1  (*****************************************************************************)
00000000  1  (******** STATUS CHECKING FUNCTIONS ******************************************)
00000000  1  (*****************************************************************************)
00000000  1  PROCEDURE GET_STATUS_FLAGS(RAW:DATAREC_PTR);
000003B2  2  BEGIN WITH RAW^ DO BEGIN
000003B8  2  IF SHIFT(SHIFT(STATUS,13),-14)=0003H                 THEN HIBYTE_STATUS :=TRUE ELSE HIBYTE_STATUS :=FALSE;
000003E6  2  IF SHIFT(SHIFT(STATUS,13),-14)=0001H                 THEN LOBYTE_STATUS :=TRUE ELSE LOBYTE_STATUS :=FALSE;
00000414  2  IF SHIFT(SHIFT(STATUS,10),-14)=0002H                 THEN PROG_STATUS   :=TRUE ELSE PROG_STATUS   :=FALSE;
00000442  2  IF SHIFT(SHIFT(STATUS,10),-14)=0001H                 THEN DATA_STATUS   :=TRUE ELSE DATA_STATUS   :=FALSE;
00000470  2  IF SHIFT(SHIFT(STATUS,15),-15)=0001H                 THEN WRITE_STATUS  :=TRUE ELSE WRITE_STATUS  :=FALSE;
0000049A  2  IF (SHIFT(SHIFT(STATUS,14),-15)=0000H) AND (DATA_STATUS) THEN WORD_STATUS :=TRUE ELSE WORD_STATUS  :=FALSE;
000004B0  2  END; END;
00000000  1  $PAGE$
00000000  1  $GLOBPROC ON$
00000000  1  (*****************************************************************************)
00000000  1  (******** FNGRFWD ************************************************************)
00000000  1  (*****************************************************************************)
00000000  1  (* INPUTS:                                                                     *)
00000000  1  (* REQ_REC        FNGR rec # of requested data record                          *)
00000000  1  (* CURR_REC       FNGR rec # of current   data record in IBUFF                 *)
00000000  1  (* CURR_FNGR_POS  FNGR rec # of next record to be read in fwd direction.       *)
00000000  1  (*****************************************************************************)
00000000  1  (* OUTPUTS:                                                                    *)
00000000  1  (* RAW            Pointer to data record just read.                            *)
00000000  1  (* CURR_REC       FNGR rec # of current   data record in IBUFF                 *)
00000000  1  (* CURR_FNGR_POS  FNGR rec # of next record to be read in fwd direction.       *)
00000000  1  (* ERROR          Display system error code.                                   *)
00000000  1  (*****************************************************************************)
00000000  1  PROCEDURE READFNGRFWD(REQ_REC:INT; VAR RAW:DATAREC_PTR; VAR ERROR:INT);
00000000  2  LABEL 1;
000004B8  2  BEGIN
000004B8  2  IF REQ_REC<>CURR_REC THEN
000004E4  2    BEGIN (*WE MUST DO A FNGR READ*)
000004E4  2    IF REQ_REC<>CURR_FNGR_POS THEN POSITION(FOOTDC_DCB,REQ_REC,ERROR); IF ERROR<>0 THEN GOTO 1;
00000512  2    RAW:=DATAREC_PTR(IBUFF);
0000051A  2    RAW^.LEN:=0; (*INTIALIZE LENGTH WORD*)
00000524  2    READ(FOOTDC_DCB, INT(RAW^.LEN),128, ERROR);
00000548  2    IF ERROR<>0 THEN GOTO 1;
00000556  2    RAW^.REC_NO:=REQ_REC;
00000562  2    CURR_REC:=REQ_REC;          (*CURRENT FNGR RECORD IN MEMORY (RAW^) *)
00000568  2    CURR_FNGR_POS:=CURR_REC+1; (*NEXT REC TO BE READ IN FWD DIRECTION*)
00000572  2    GET_STATUS_FLAGS(RAW);
00000580  2    END;    (*WE MUST DO A FNGR READ*)
00000580  2  1:IF ERROR=EOF THEN
0000058E  2    BEGIN
0000058E  2    GET_REC_NUM(CURR_FNGR_POS);
0000059A  2    CURR_REC:=0;
0000059E  2    END
0000059E  2  END;
00000000  1  $PAGE$
00000000  1  $GLOBPROC ON$
00000000  1  (*****************************************************************************)
00000000  1  (******** FNGRBKWD ***********************************************************)
00000000  1  (*****************************************************************************)
00000000  1  (* INPUTS:                                                                     *)
00000000  1  (* REQ_REC        FNGR rec # of requested data record                          *)
00000000  1  (* CURR_REC       FNGR rec # of current   data record in IBUFF                 *)
00000000  1  (* CURR_FNGR_POS  FNGR rec # of next record to be read in fwd direction.       *)
```

```
00000000 1 (****************************************************************************)
00000000 1 (* OUTPUTS:                                                                 *)
00000000 1 (* RAW            Pointer to data record just read.                         *)
00000000 1 (* CURR_REC       FMGR rec # of current   data record in IBUFF              *)
00000000 1 (* CURR_FMGR_POS  FMGR rec # of next record to be read in fwd direction.    *)
00000000 1 (* ERROR          Display system error code.                                *)
00000000 1 (****************************************************************************)
00000000 1 PROCEDURE READFMGRBKWD(REQ_REC:INT; VAR RAW:DATAREC_PTR; VAR ERROR:INT);
00000000 2 LABEL 1;
00000000 2 VAR LENGTH:INT; (*# OF WORDS READ IN FMGR RECORD*)
000005A6 2 BEGIN
000005A6 2 IF REQ_REC<>CURR_REC THEN
000005B2 2   BEGIN (*WE MUST DO A FMGR READ*)
000005B2 2   IF REQ_REC <> CURR_FMGR_POS-1 THEN POSITION(FOOTDC_DCB,REQ_REC+1 ,ERROR); IF ERROR<>0 THEN GOTO 1;
000005E6 2   IBUFF^[MAXIBUFF]:=0;  (*INTITIALIZE LENGTH WORD*)
000005EE 2   READBACKWARD(FOOTDC_DCB,INT(IBUFF^[MAXIBUFF]),128,ERROR);
00000610 2   IF ERROR<>0 THEN GOTO 1;
0000061E 2   LENGTH:=SHIFT(IBUFF^[MAXIBUFF],-8); (*Get length of record read*)
0000062C 2   RAW:=DATAREC_PTR(ADDR(IBUFF^[MAXIBUFF-(LENGTH+NOM_FMGR+1)])); (*PT TO REC WORD ONE BEFORE REC LENGHT WORD*)
00000642 2   RAW^.LEN:=LENGTH; (*PUT LENGTH WORD AT START OF RECORD*)
00000648 2   RAW^.REC_NO:=REQ_REC;
00000654 2   CURR_REC:=REQ_REC;
0000065A 2   CURR_FMGR_POS:=CURR_REC;
00000660 2   GET_STATUS_FLAGS(RAW);
0000066E 2   END;  (*WE MUST DO A FMGR READ*)
0000066E 2 1:IF ERROR=EOF THEN
0000067C 2   BEGIN
0000067C 2   GET_REC_NUM(CURR_FMGR_POS);
00000688 2   CURR_REC:=0;
0000068C 2   END
0000068C 2 END;
00000000 1 $PAGE$
00000000 1 $GLOBPROC OFF$
00000000 1 (****************************************************************************)
00000000 1 (******** GET_TYP ***********************************************************)
00000000 1 (****************************************************************************)
00000000 1 (* Determin if the record is a data cycle or not. If it is, determin         *)
00000000 1 (* which of the bytes are valid. bytes are valid only if the emulatin status *)
00000000 1 (* says they are valid and the symbol index is not OFFH.                     *)
00000000 1 (* INTEL analysis data cycles are backward (for word satuses).  For example if the *)
00000000 1 (* address is 100, the ms byte of data is from address 101 and the ls byte   *)
00000000 1 (* of data is from address 100.  The entire display software assumes the     *)
00000000 1 (* opposit, therfore if it is an intel processor and if the status is        *)
00000000 1 (* data, word and analysis (as apposed to memory) TYP is set to WORD10.      *)
00000000 1 (****************************************************************************)
00000000 1 (* INPUTS:                                                                  *)
00000000 1 (* RAW            Pointer to footdc raw data record.                        *)
00000000 1 (****************************************************************************)
00000000 1 (* OUTPUTS:                                                                 *)
00000000 1 (* RETURN_TYP     LSBYTE    = data cycle, only ls byte is valid.            *)
00000000 1 (*                MSBYTE    = data cycle, only ms byte is valid.            *)
00000000 1 (*                WORD01 = data cycle, both bytes are valid.                *)
00000000 1 (*                WORD10 = data cycle, both bytes are valid.                *)
00000000 1 (*                OTHER    = not a data cycle, ==> prog cycle, frame record, ect.  *)
00000000 1 (****************************************************************************)
00000000 1 PROCEDURE GET_TYP(RAW:DATAREC_PTR; VAR RETURN_TYP:RECORD_TYPE);
00000694 2 BEGIN WITH RAW^ DO BEGIN
                                                               (*INITILZE TO NOT DATA CYCLE*)
0000069A 2 RETURN_TYP:=OTHER;
000006A2 2 IF (TYP IN [1,2,3,4,5,6]) AND (DATA_STATUS)  THEN (*DATA CYCLE*)
000006C8 2   IF LOBYTE_STATUS                           THEN RETURN_TYP:=LSBYTE (*BYTE STATUS LO BYTE*)
000006DA 2     ELSE IF HIBYTE_STATUS                    THEN RETURN_TYP:=MSBYTE (*BYTE STATUS HI BYTE*)
000006F2 2       ELSE IF SHIFT(S,-8)=0FFH               THEN RETURN_TYP:=LSBYTE (*WORD STATUS BUT ONLY LO BYTE HAS SYMBOL INDEX*
0000070E 2         ELSE IF SHIFT(SHIFT(S,8),-8)=0FFH    THEN RETURN_TYP:=MSBYTE (*WORD STATUS BUT ONLY HI BYTE HAS SYMBOL INDEX*
0000072E 2           ELSE IF (SHIFT(STATUS,-15)=0)
0000072E 2           AND (ENVIRONMENT^.INTEL)           THEN RETURN_TYP:=WORD10 (*WORD STATUS BOTH BYTES HAVE SYMBOL INDEX*)
0000075C 2                                              ELSE RETURN_TYP:=WORD01;(*WORD STATUS BOTH BYTES HAVE SYMBOL INDEX*)
00000764 2 END;  END;
00000000 1 $PAGE$
00000000 1 $GLOBPROC ON$
00000000 1 (****************************************************************************)
00000000 1 (******** GET_DATA_ADDR *****************************************************)
00000000 1 (****************************************************************************)
00000000 1 (* INPUTS:                                                                  *)
00000000 1 (* RAW            Pointer to data record just read.                         *)
00000000 1 (* BYTE_INDEX     Index to MS byte (0) or LS byte (1) of footdc data word.  *)
00000000 1 (* TYP            Type of footdc record.                                    *)
00000000 1 (*                WORD01  Word data, MS data byte from memory address + 0.  *)
```

```
00000000  1  (*                        LS data byte from memory address + 1.            *)
00000000  1  (*                WORD10  Word data, MS data byte from memory address + 1. (Intel)  *)
00000000  1  (*                        LS data byte from memory address + 0. (Intel)     *)
00000000  1  (*                HIBYTE  Byte data, MS data byte from memory address + 0.  *)
00000000  1  (*                LOBYTE  Byte data, LS data byte from memory address + 0.  *)
00000000  1  (*                OHTER   Everything other than data.                       *)
00000000  1  (****************************************************************************)
00000000  1  (* OUTPUTS:                                                                  *)
00000000  1  (* BYTE_INDEX     Index to MS byte (0) or LS byte (1) of footdc data word.   *)
00000000  1  (* DATA_ADDR      Buss address of DATA_BYTE iff record is data record.       *)
00000000  1  (* DATA_BYTE      Buss address of DATA_BYTE iff record is data record.       *)
00000000  1  (* SYMBOL_NO      Index to symbol table     iff record is data record.       *)
00000000  1  (****************************************************************************)
00000000  1  PROCEDURE GET_DATA(RAW:DATAREC_PTR; BYTE_INDEX:INT; TYP:RECORD_TYPE;
00000000  2                     VAR DATA_ADDR:INTEGER; VAR DATA_BYTE:BYTE; VAR SYMBOL_NO:INT);
00000000  2  VAR
00000000  2  TEMP        :INTEGER;  (* 32 BIT FORM OF BYTE_INDEX*)
0000076C  2
0000076C  2  BEGIN
0000076C  2  (***** GET SYMBOL INDEX ****)
0000076C  2  IF BYTE INDEX=0
00000774  2    THEN SYMBOL_NO:=SHIFT(RAW^.S,-8)
00000788  2    ELSE SYMBOL_NO:=SHIFT(SHIFT(RAW^.S,8),-8);
0000079A  2
0000079A  2  (***** GET DATA_ADDR *****)
0000079A  2  IF RAW^.WORD_STATUS THEN
000007A6  2    BEGIN
000007A6  2    EXTEND(BYTE_INDEX,TEMP);  (*SIGN EXTEND BYTE INDEX INTO 32 BIT INTEGER*)
000007B6  2    ADD32(TEMP,RAW^.BUSS_ADDR,DATA_ADDR);
000007D4  2    END
000007D8  2    ELSE
000007D8  2    DATA_ADDR:=RAW^.BUSS_ADDR;
000007E4  2
000007E4  2  (***** GET DATA_BYTE ****)
000007E4  2  IF TYP=WORD10 THEN BYTE_INDEX:=(BYTE_INDEX+1) MOD 2;  (*Get opposite byte for gravy sucking pig Intel*)
00000808  2  IF BYTE_INDEX=0
00000810  2    THEN DATA_BYTE:=SHIFT(RAW^.BUSS_DATA,-8)
00000824  2    ELSE DATA_BYTE:=SHIFT(SHIFT(RAW^.BUSS_DATA,8),-8);
00000836  2  END;
00000000  1  $PAGE$
00000000  1  $GLOBPROC ON$.
00000000  1  (****************************************************************************)
00000000  1  (********** READFWD **********************************************************)
00000000  1  (****************************************************************************)
00000000  1  (*Read the requested record and update POSITION.                             *)
00000000  1  (*For updating POSITION, all data records are considered to have 2 bytes or positions *)
00000000  1  (*There may be 0, 1 or 2 bytes of acual data in a data record.               *)
00000000  1  (****************************************************************************)
00000000  1  (* INPUTS:                                                                   *)
00000000  1  (* POSITION        Starting position is immediatly before data to be read.   *)
00000000  1  (****************************************************************************)
00000000  1  (* OUTPUTS:                                                                  *)
00000000  1  (* POSITION        Ending position is immediatly after data that was read.   *)
00000000  1  (* RAW             Pointer to data record just read.                         *)
00000000  1  (* DATA_BYTE       Data byte iff record is data record.                      *)
00000000  1  (* DATA_ADDR       Buss address of DATA_BYTE iff record is data record.      *)
00000000  1  (* BYTE_INDEX      0==> DATA_BYTE is MS byte of RAW^.BUSS_DATA, 1==> LS byte *)
00000000  1  (* SYMBOL_NO       Symbol number for DATA_ADDR,DATA_BYTE                     *)
00000000  1  (* ERROR           Display system error code.                                *)
00000000  1  (****************************************************************************)
00000000  1  PROCEDURE READFWD     (VAR RAW:DATAREC_PTR; VAR DATA_BYTE:BYTE; VAR DATA_ADDR:INTEGER;
00000000  2                         VAR BYTE_INDEX, SYMBOL_NO:INT; VAR POSITION:INT; VAR ERROR:INT);
00000000  2  LABEL 1;
00000000  2  VAR
00000000  2  TYP          :RECORD_TYPE;
00000001  2  REC_NO       :INT;        (*FMGR RECORD NUMBR REQUESTED*)
0000083E  2
0000083E  2  BEGIN
0000083E  2  IF POSITION<0 THEN BEGIN ERROR:=1; GOTO 1; END;
00000854  2  REC_NO:=ENVIRONMENT^.FIRST_DATA_REC+POSITION DIV 2;
0000086E  2  READFMGRFWD(REC_NO,RAW,ERROR);
00000883  2  IF ERROR <> 0 THEN GOTO 1;
00000896  2  GET_TYP(RAW,TYP);
000008A9  2  IF (TYP=MSBYTE) AND (POSITION MOD 2 = 1) THEN
000008DA  2    BEGIN (*POSITION IS ALREADY POINTING PAST THE ONLY DATA BYTE IN RECORD*)
000008DA  2    REC_NO:=REC_NO+1;
000008DE  2    POSITION:=POSITION+1;
```

```
00000BE8 2    READFMGRFWD(REC_NO,RAW,ERROR);
00000904 2    IF ERROR <> 0 THEN GOTO 1;
00000912 2    GET_TYP(RAW,TYP);
00000924 2    END;  (*POSITION IS ALREADY POINTING PAST THE ONLY DATA BYTE IN RECORD*)
00000924 2
00000924 2  CASE TYP OF
0000092E 2    WORD01,
0000092E 2    WORD10 :BEGIN BYTE_INDEX:=POSITION MOD 2; POSITION:=POSITION+1;              END;
00000956 2    MSBYTE :BEGIN BYTE_INDEX:=0;              POSITION:=((POSITION+2) DIV 2)*2; END;
00000978 2    LSBYTE :BEGIN BYTE_INDEX:=1;              POSITION:=((POSITION+2) DIV 2)*2; END;
0000099C 2    OTHER  :BEGIN BYTE_INDEX:=1;              POSITION:=((POSITION+2) DIV 2)*2; END;
000009C0 2    OTHERWISE;
000009C0 2    END;
000009E8 2  IF TYP <> OTHER
000009F4 2    THEN GET_DATA(RAW,BYTE_INDEX,TYP,DATA_ADDR,DATA_BYTE,SYMBOL_NO)(*RAW is     buss data cycle or memory data*)
00000A24 2    ELSE SYMBOL_NO:=SHIFT(SHIFT(RAW^.S,8),-8);                 (*RAW is not buss data cycle or memory data*)
00000A38 2  1:END;
00000000 1  $PAGE$
00000000 1  $GLCDPROC ON$
00000000 1  (*****************************************************************************)
00000000 1  (********* READBKWD ***********************************************************)
00000000 1  (*****************************************************************************)
00000000 1  (*Read the requested record and update POSITION.                              *)
00000000 1  (*For updating POSITION, all data records are considered to have 2 bytes or positions *)
00000000 1  (*There may be 0, 1 or 2 bytes of acual data in a data record.               *)
00000000 1  (*****************************************************************************)
00000000 1  (* INPUTS:                                                                   *)
00000000 1  (* POSITION       Starting position is immediatly after data to be read.     *)
00000000 1  (*****************************************************************************)
00000000 1  (* OUTPUTS:                                                                  *)
00000000 1  (* POSITION       Ending position is immediatly before data that was read.   *)
00000000 1  (* RAW            Pointer to data record just read.                          *)
00000000 1  (* DATA_BYTE      Data byte iff record is data record.                       *)
00000000 1  (* DATA_ADDR      Buss address of DATA_BYTE iff record is data record.       *)
00000000 1  (* BYTE_INDEX     0==> DATA_BYTE is MS byte of RAW^.BUSS_DATA, 1==> LS byte  *)
00000000 1  (* SYMBOL_NO      Symbol number for DATA_ADDR,DATA_BYTE                      *)
00000000 1  (* ERROR          Display system error code.                                 *)
00000000 1  (*****************************************************************************)
00000000 1  PROCEDURE READBKWD   (VAR RAW:DATAREC_PTR; VAR DATA_BYTE:BYTE; VAR DATA_ADDR:INTEGER;
00000000 2                        VAR BYTE_INDEX, SYMBOL_NO:INT; VAR POSITION:INT; VAR ERROR:INT);
00000000 2  LABEL 1;
00000000 2  VAR
00000000 2  TYP        :RECORD_TYPE;
00000001 2  REC_NO     :INT;       (*FMGR RECORD NUMBR REQUESTED*)
00000A40 2
00000A40 2  BEGIN
00000A40 2  IF POSITION=0 THEN BEGIN ERROR:=1; GOTO 1; END;
00000A56 2  REC_NO:=ENVIRONMENT^.FIRST_DATA_REC+(POSITION-1) DIV 2;
00000A72 2  READFMGRBKWD(REC_NO,RAW,ERROR);
00000A8C 2  IF ERROR <> 0 THEN GOTO 1;
00000A9A 2  GET_TYP(RAW,TYP);
00000AAC 2  IF (TYP=LSBYTE) AND (POSITION MOD 2 = 1) THEN
00000ADA 2    BEGIN (*POSITION IS ALREADY POINTING INFRONT OF THE ONLY DATA BYTE IN RECORD*)
00000ADA 2    REC_NO:=REC_NO-1;
00000ADE 2    POSITION:=POSITION-1;
00000AE8 2    READFMGRBKWD(REC_NO,RAW,ERROR);
00000B04 2    IF ERROR <> 0 THEN GOTO 1;
00000B12 2    GET_TYP(RAW,TYP);
00000B24 2    END;  (*POSITION IS ALREADY POINTING INFRONT OF THE ONLY DATA BYTE IN RECORD*)
00000B24 2
00000B24 2
00000B24 2  CASE TYP OF
00000B2E 2    WORD01,
00000B2E 2    WORD10 :BEGIN BYTE_INDEX:=(POSITION-1) MOD 2; POSITION:=POSITION-1;          END;
00000B58 2    MSBYTE :BEGIN BYTE_INDEX:=0;              POSITION:=((POSITION-1) DIV 2)*2; END;
00000B7A 2    LSBYTE :BEGIN BYTE_INDEX:=1;              POSITION:=((POSITION-1) DIV 2)*2; END;
00000B9E 2    OTHER  :BEGIN BYTE_INDEX:=1;              POSITION:=((POSITION-1) DIV 2)*2; END;
00000BC2 2    OTHERWISE;
00000BC2 2    END;
00000BEA 2  IF TYP <> OTHER
00000BF6 2    THEN GET_DATA(RAW,BYTE_INDEX,TYP,DATA_ADDR,DATA_BYTE,SYMBOL_NO)(*RAW is     buss data cycle or memory data*)
00000C26 2    ELSE SYMBOL_NO:=SHIFT(SHIFT(RAW^.S,8),-8);                 (*RAW is not buss data cycle or memory data*)
00000C3A 2  1:END;
****WARNING ?? - Symbol: LABEL_1, is duplicated in the asmb_sym file.

End of compilation, number of errors=    0
```

```
00000000 1  "68000" PREPROCESS
00000000 1  #DEFINE M68000 TRUE
00000000 1  (*****************************************************************************)
00000000 1  (**********  FMTSYM  *********************************************************)
00000000 1  (*****************************************************************************)
00000000 1  (* FORMAT A SYMBOL INTO A TEXT STRING                                          *)
00000000 1  (*****************************************************************************)
00000000 1  PROGRAM PFMTSYM;
00000000 1  $EXTENSIONS ON$
00000000 1  $WIDTH 120$
00000000 1  $LIB_ABS_LONG$
00000000 1  $CALL ABS_LONG+$
00000000 1  #INCLUDE TYPES:KIP
00000000 1  $EXTVAR ON$
00000000 1  VAR
00000000 1  ENVIRONMENT:ENVIRONMENT_PTR;
00000000 1  $EXTVAR OFF$
00000000 1
00000000 1
00000000 1  (*****************************************************************************)
00000000 1  (**********  EXTERNAL PROCEDURES  *********************************************)
00000000 1  (*****************************************************************************)
00000000 1  FUNCTION  GE              (OP1,OP2:INTEGER):BOOLEAN; EXTERNAL;
00000000 1  FUNCTION  LE              (OP1,OP2:INTEGER):BOOLEAN; EXTERNAL;
00000000 1  FUNCTION  GT              (OP1,OP2:INTEGER):BOOLEAN; EXTERNAL;
00000000 1  FUNCTION  LT              (OP1,OP2:INTEGER):BOOLEAN; EXTERNAL;
00000000 1  FUNCTION NEXTNODE         (VAR OFFSET:INT):PTR; EXTERNAL;
00000000 1  PROCEDURE SCALAR          (VALUE:INTEGER; VAR TEXT:STRNG; P:PTR); EXTERNAL;
00000000 1  PROCEDURE SUBRANGE        (VALUE:INTEGER; VAR TEXT:STRNG; P:PTR); EXTERNAL;
00000000 1  PROCEDURE FUNDAMENTAL     (VALUE:INTEGER; VAR TEXT:STRNG; P:PTR; SIGN_FLAG:INT); EXTERNAL;
00000000 1  PROCEDURE FMTSYMBOL       (SOURCE,DEST:PTR; DEST_OFFSET:INT; VAR LEN:INT);EXTERNAL;
00000000 1  PROCEDURE MOVEBYTES       (SOURCE:PTR; SOURCE_OFFSET:INT; DEST:PTR; DEST_OFFSET:INT; COUNT:INT); EXTERNAL;
00000000 1  PROCEDURE PUTCHAR         (DEST:PTR; DEST_OFFSET:INT; CHARACTER:CHAR); EXTERNAL;
00000000 1  PROCEDURE GETCHAR         (SOURCE:PTR; SOURCE_OFFSET:INT; VAR CHARACTER:CHAR); EXTERNAL;
00000000 1  PROCEDURE EXTEND          (OP1:INT; VAR RESULT:INTEGER);EXTERNAL;
00000000 1  PROCEDURE ADD32           (OP1,OP2:INTEGER; VAR RESULT:INTEGER);EXTERNAL;
00000000 1  PROCEDURE SUBTRACT32      (OP1,OP2:INTEGER; VAR RESULT:INTEGER);EXTERNAL;
00000000 1  PROCEDURE MULTIPLY32      (OP1,OP2:INTEGER; VAR RESULT:INTEGER);EXTERNAL;
00000000 1  PROCEDURE DIVIDE32        (OP1,OP2:INTEGER; VAR RESULT:INTEGER);EXTERNAL;
00000000 1  PROCEDURE FORMAT          (SIGN_FLAG:INT; SOURCE:PTR; SOURCESIZE:INT;
00000000 2                            DEST:PTR; DEST_OFFSET:INT; VAR DESTSIZE:INT; BASE:INT; JUSTIFY:INT); EXTERNAL;
00000000 1  $PAGE$
00000000 1  $GLOBPROC OFF$
00000000 1  (**********************************************************************)
00000000 1  (**********  C-PTRS  **************************************************)
00000000 1  (**********************************************************************)
00000000 1  (* Convert pascal pointer expresions to c pointer expresions.         *)
00000000 1  (**********************************************************************)
00000000 1  PROCEDURE C_PTR(VAR TEXT:STRNG);
00000000 2  VAR
00000000 2  C1   :CHAR;
00000001 2  C2   :CHAR;
00000002 2  I    :INT;
00000004 2  P    :PTR;
00000004 2  BEGIN WITH TEXT DO BEGIN
0000000C 2  P:=PTR(ADDR(TEXT.ASCII));
00000014 2  GETCHAR(P,LEN-1,C1);
0000002E 2  IF C1="^" THEN
0000003A 2    BEGIN (* Leading "*" *)
0000003A 2    FOR I:=LEN-2 DOWNTO 0 DO
0000004E 2      BEGIN
0000004E 2      GETCHAR(P,I,C1);
00000066 2      PUTCHAR(P,I+1,C1);
0000007E 2      END;
0000008E 2    PUTCHAR(P,0,"*");
000000A0 2    END;  (* Leading "*" *)
000000A0 2  FOR I:=0 TO LEN-2 DO
000000B8 2    BEGIN (*Replace  ".^"  with  "->"  *)
000000B8 2    GETCHAR(P,I,  C1);
000000D0 2    GETCHAR(P,I+1,C2);
000000EC 2    IF (C1="^") AND (C2=".") THEN
0000010E 2      BEGIN
0000010E 2      PUTCHAR(P,I,  "-");
00000122 2      PUTCHAR(P,I+1,">");
0000013A 2      END;
0000013A 2    END;  (*Replace  ".^"  with  "->"  *)
0000014E 2  END; END; (*End WITH, end procedure*)
00000000 1  $PAGE$
```

```
00000000  1  $GLOBPROC OFF$
00000000  1  (*************************************************************************)
00000000  1  (********** ARRAY NODES **************************************************)
00000000  1  (*************************************************************************)
00000000  1  (* This procedure formats array indexes by treating a whole multi-      *)
00000000  1  (* dimensional array as a nesting of one dimensional subarrays.         *)
00000000  1  (*************************************************************************)
00000000  1  (* INPUTS:                                                               *)
00000000  1  (* P           Points to data base ARRAY NODE                            *)
00000000  1  (* STRUC_ADDR  Absolute address of the array.                            *)
00000000  1  (* DATA_ADDR   Absolute address of the data byte within the array.       *)
00000000  1  (*************************************************************************)
00000000  1  (* OUTPUTS:                                                              *)
00000000  1  (* P           Points to  data base for array element of intrest.        *)
00000000  1  (* STRUC_ADDR  Absolute address of the element of intrest.              *)
00000000  1  (* TEXT        String of formatted data.                                 *)
00000000  1  (* PAD         TRUE  if DATA_ADDR is address of a pad byte.              *)
00000000  1  (*************************************************************************)
00000000  1  PROCEDURE ARRAYV(VAR TEXT:STRNG; VAR P:PTR; DATA_ADDR:INTEGER;
00000000  2                 VAR STRUC_ADDR:INTEGER; VAR PAD:BOOLEAN);
00000000  2  TYPE
00000000  2  ARRAY_NODE=RECORD
00000000  3    NODE_TYPE              :INT;
00000000  3    STRUC_SIZE             :INT;
00000000  3    DUMMY                  :INT;
00000000  3    OFFSET_TO_ELEMENTTYPE  :INT;
00000000  3    OFFSET_TO_INDEXTYPE    :INT;
00000000  3    LOWER_BOUND            :INTEGER;
00000000  3    UPPER_BOUND            :INTEGER:
00000000  2    END;
00000000  2  ARRAY_NODE_PTR=^ARRAY_NODE;
00000000  2  VAR
00000000  2  ELEMENT_SIZE      :INTEGER;        (*SIZE OF 1 ELEMENT IN CURRENT ONE DIMENSIONAL ARRAY OR SUBARRAY*)
00000004  2  ELEMENT_NO        :INTEGER;        (*ELEMENT OF INTERST   CURRENT ONE DIMENSIONAL ARRAY OF SYBARRAY*)
00000008  2  INDEX             :INTEGER;        (*ORDINAL VALUE OF CURRENT INDEX*)
0000000C  2  OFFSET            :INTEGER;        (*NO OF BYTES INTO CURRENT ARRAY OR SUBARRAY*)
00000010  2  TEMP              :INTEGER;
00000014  2  Q                 :ARRAY_NODE_PTR; (*PTR TO THE ARRAY NODE*)
00000018  2  TYP               :ARRAY_NODE_PTR; (*PTR TO THE TYPE OF AN ELEMENT, ELEMENT MAY NOT BE ARRAY*)
0000001C  2  P1                :PTR;        (*PTR TO THE TYPE OF AN INDEX*)
00000020  2  CHARACTER         :CHAR;
00000021  2  $PAGE$
00000156  2
00000156  2  BEGIN WITH TEXT DO BEGIN
0000015E  2  PUTCHAR(PTR(ADDR(ASCII)),LEN,"[");
00000172  2  LEN:=LEN+1;
00000173  2  WHILE P^=ARRAY_ DO
00000188  2    BEGIN  (*FORMAT NEXT INDEX*)
00000188  2    Q:=ARRAY_NODE_PTR(P);                   (*Q    PTS TO ARRAY NODE*)
00000190  2    P:=NEXTNODE(Q^.OFFSET_TO_ELEMENTTYPE); (*P    PTS TO THE TYPE OF ELEMENT NODE*)
000001A6  2    TYP:=ARRAY_NODE_PTR(P);                 (*TYPE PTS TO THE TYPE OF ELEMENT NODE*)
000001AE  2    P1:=NEXTNODE(Q^.OFFSET_TO_INDEXTYPE);  (*P1   PTS TO THE TYPE OF INDEX   NODE*)
000001C2  2    SUBTRACT32(DATA_ADDR,STRUC_ADDR,OFFSET); (*OFFSET:=DATA_ADDR-STRUC_ADDR*)
000001DC  2    EXTEND(TYP^.STRUC_SIZE,ELEMENT_SIZE);  (*EXTEND FROM 16BIT TYPE^.STRUC_SIZE TO 32 BIT ELEMENT_SIZE*)
000001F0  2    DIVIDE32(OFFSET,ELEMENT_SIZE,ELEMENT_NO);  (*ELEMENT_NO:=OFFSET/ELEMENT_SIZE*)
00000208  2    ADD32(ELEMENT_NO,Q^.LOWER_BOUND,INDEX);    (*INDEX:=ELEMENT_NO_Q^.LOWER_BOUND*)
00000224  2    CASE SHIFT(SHIFT(P1^,8),-8) OF      (*Format INDEX depending on its type*)
00000236  2      SCALAR_       :SCALAR     (INDEX,TEXT,P1);   (*PASCAL or C*)
00000254  2      SUBRANGE_     :SUBRANGE   (INDEX,TEXT,P1);   (*PASCAL only! In C we go directly to FUNDEMENTAL without a SUBRANGE
00000272  2      FUNDAMENTAL_  :FUNDAMENTAL(INDEX,TEXT,P1,0); (*C only! In PASCAL we always get to FUNDEMENTAL via SUBRANGE*)
00000292  2      OTHERWISE;
00000292  2      END;         (*END CASE*)
000002CA  2    PUTCHAR(PTR(ADDR(ASCII)),LEN,",");
000002E2  2    LEN:=LEN+1;
000002E8  2    MULTIPLY32(ELEMENT_NO, ELEMENT_SIZE,TEMP); (*TEMP:=ELEMENT_NO*ELEMENT_SIZE*)
00000300  2    ADD32(STRUC_ADDR, TEMP,STRUC_ADDR); (*STRUC_ADDR:=STRUC_ADDR+TEMP*)
0000031C  2    END;  (*FORMAT NEXT INDEX*)
00000320  2  PUTCHAR(PTR(ADDR(ASCII)),LEN-1,"]");  (*WRITE OFER LAST COMMA*)
0000033C  2  (*************************************************************************)
0000033C  2  (* IF THE ELEMENT WAS A PAD BYTE THEN THE LAST INDEX  THAT WAS FORMATTED  *)
0000033C  2  (* WAS OUTSIDE THE LEGAL RANGE FOR THE INDEX AND WAS FORMATTED WITH A "?". *)
0000033C  2  (*************************************************************************)
0000033C  2  GETCHAR(PTR(ADDR(ASCII)),LEN-2,CHARACTER);
0000035C  2  IF CHARACTER="?" THEN
00000368  2    BEGIN
00000368  2    PAD:=TRUE;
00000370  2    STRUC_ADDR:=DATA_ADDR;                 (*Don't take this out. I did it once and it was a mistake*)
00000378  2    END;
```

```
00000378  2  END; END; (*END WITH TEXT*) (*END PROCEDURE ARRAY*)
00000000  1  $PAGE$
00000000  1  $GLOBPROC OFF$
00000000  1  (*******************************************************************)
00000000  1  (********** RECORD NODES *******************************************)
00000000  1  (*******************************************************************)
00000000  1  (* INPUTS:                                                          *)
00000000  1  (* P           Points to data base RECORD_NODE.                     *)
00000000  1  (* STRUC_ADDR  Absolute address of the record.                      *)
00000000  1  (* DATA_ADDR   Absolute address of the data byte within the record. *)
00000000  1  (*******************************************************************)
00000000  1  (* OUTPUTS:                                                         *)
00000000  1  (* P           Pts to type node for field corrosponding to DATA_ADDR. *)
00000000  1  (* STRUC_ADDR  Absolute address of the field of intrest.           *)
00000000  1  (* TEXT        String of formatted data.                            *)
00000000  1  (* PAD         TRUE  if DATA_ADDR is address of a pad byte.         *)
00000000  1  (*******************************************************************)
00000000  1  PROCEDURE RECORDD(VAR TEXT:STRNG; VAR P:PTR; DATA_ADDR:INTEGER;
00000000  2                    VAR STRUC_ADDR:INTEGER; VAR PAD:BOOLEAN);
00000000  2  TYPE
00000000  2  HEADER_NODE=RECORD          (*A HEADER_NODE is either a record_node or a varient_node*)
00000000  3    WORD1            :INT;    (*NODE_TYPE IN LSB*)
00000000  3    STRUC_SIZE       :INT;    (*SIZE OF STRUCTURE IN BYTES*)
00000000  3    SELECT_VALUE     :INT;
00000000  3    OFFSET_TO_FIELD  :INT;    (*OFFSET TO THE FIRST FIELD OF THE RECORD OF VARIANT*)
00000000  3    OFFSET_TO_VAR    :INT;    (*OFFSET TO THE NEXT VARIANT FILED*)
00000000  2    END;
00000000  2  FIELD_NODE=RECORD           (*A FIELD_NODE is either a regular field node or a selector node*)
00000000  3    WORD1            :INT;    (*NODE_TYPE IN LSB*)
00000000  3    FIELD_LOCATION   :INTEGER; (*LOCATION OF THIS FIELD RELETIVE TO START OF RECORD*)
00000000  3    OFFSET_TO_FIELD  :INT;    (*OFFSET TO NEXT FIELD, 0 IFF NO NEXT FIELD*)
00000000  3    OFFSET_TO_TYPE   :INT;
00000000  3    CASE INT OF
00000000  3    1:(SYMBOL         :ARRAY [0..7] OF INT);
00000000  3    2:(OFFSET_TO_TAG  :INT;
00000000  3      SELECT_FLAG     :INT;     (*1==> TRUE,ie TAG VALUE IS KNOWN OR USER HAS SPECIFIED VARIANT*)
00000000  3      SELECT_VALUE    :INT);    (*TAG VALUE OR USER SPECIFIED VARIANT SELECTORTOR IFF TAG_FLAG=TRUE*)
00000000  2    END;
00000000  2  HEADER_NODE_PTR  =^HEADER_NODE;
00000000  2  FIELD_NODE_PTR   =^FIELD_NODE;
00000000  2
00000000  2  VAR
00000000  2  MAX              :INTEGER;          (*Max address in logical field, physical maximum will be one larger iff padded*)
00000004  2  SYMBOLSIZE       :INT;              (*No of chars formatted for symbol*)
00000006  2  Q                :HEADER_NODE_PTR;  (*Ptr to the HEADER_NODE of a field list*)
0000000A  2  LEAD             :FIELD_NODE_PTR;   (*Ptr to a FIELD_NODE, this ptr leads  FOO  by one node*)
0000000E  2  FOO              :FIELD_NODE_PTR;   (*Ptr to a FIELD_NODE, this ptr trails LEAD by one node*)
00000012  2  OFFSET           :INTEGER;          (*Byte offset of DATA_ADDRESS from start of record*)
00000016  2  TEMP             :INTEGER;          (*Temporary for 16 to 32 bit conversions*)
0000001A  2  CHARCOUNT        :INT;              (*No if chars to format when formating offsets for pad bytes*)
0000001C  2  MORE             :BOOLEAN;          (*TRUE if there is another field list to search*)
0000001D  2  FOOTYPE          :INT;              (*Type of node pointed to by FOO*)
00000020  2  $PAGE$
00000000  2  PROCEDURE PAD_BYTE;
00000380  3  BEGIN WITH TEXT DO BEGIN
0000038C  3  PAD:=TRUE;
00000394  3  STRUC_ADDR:=DATA_ADDR;                  (*Don't take this out, I did it once and it was a mistake*)
000003A0  3  PUTCHAR(PTR(ADDR(ASCII)),LEN,"+");
000003B8  3  LEN:=LEN+1;
000003BE  3  CHARCOUNT:=9; (*FORMAT MAX OF 9 CHARACTERS*)
000003C0  3  FORMAT(UNSIGNED,PTR(ADDR(OFFSET)),4,PTR(ADDR(ASCII)),LEN,CHARCOUNT,16,RIGHT);
000003FA  3  LEN:=LEN+CHARCOUNT;
00000408  3  PUTCHAR(PTR(ADDR(ASCII)),LEN,"?");
00000420  3  LEN:=LEN+1;
00000426  3  END; END;
0000042E  2
0000042E  2
0000042E  2  BEGIN WITH TEXT DO BEGIN
00000436  2  PUTCHAR(PTR(ADDR(ASCII)),LEN,".");
0000044A  2  LEN:=LEN+1;
00000450  2  SUBTRACT32(DATA_ADDR, STRUC_ADDR,OFFSET); (*OFFSET:=DATA_ADDR-STRUC_SIZE*)
0000046A  2  Q:=HEADER_NODE_PTR(P);
00000472  2  WHILE Q<>NIL DO
0000047A  2    BEGIN (*Search the field list pointed to by Q*)
0000047A  2    FOO:=FIELD_NODE_PTR(Q); (*Inintialize field pointer to list head (not really a field) *)
00000480  2    LEAD:=FIELD_NODE_PTR(NEXTNODE(Q^.OFFSET_TO_FIELD)); (*LEAD pts to first field (if there is one) *)
00000494  2    WHILE (LEAD<>NIL) AND (GE(OFFSET,LEAD^.FIELD_LOCATION)) DO
000004B8  2      BEGIN (*Go to next node in field list*)
```

```
000004B8  2      FOO:=LEAD;
000004BE  2      LEAD:=FIELD_NODE_PTR(NEXTNODE(LEAD^.OFFSET_TO_FIELD)); (*FOO pts to next field node*)
000004D2  2      END;  (*Go to next node in field list*)
000004D4  2
000004D4  2    (*FOO pts to a field node, a selector node or a field list header node*)
000004D4  2    FOOTYPE:=SHIFT(SHIFT(FOO^.WORD1,8),-8); (*What type of node does foo pt to?*)
000004E2  2    IF FOOTYPE=SELECT_ THEN
000004EA  2      BEGIN (*FOO pts to a select node.  Select a variant*)
000004EA  2      Q:=HEADER_NODE_PTR(NEXTNODE(FOO^.OFFSET_TO_TYPE)); (*Another field list to search*)
000004FE  2      IF FOO^.SELECT_FLAG=1        (*SELECT_FLAG=1 ==> TRUE*)
0000050E  2        THEN (*Select a variant to match FOO^.SELECT_VALUE*)
0000050E  2        WHILE (FOO^.SELECT_VALUE<>Q^.SELECT_VALUE) AND (Q^.OFFSET_TO_VAR<>0) DO
00000534  2          Q:=HEADER_NODE_PTR(NEXTNODE(Q^.OFFSET_TO_VAR)) (*Select a variant node*)
0000054A  2        ELSE  (*No selection given, if it is C-bit-fields then I will format all variants*)
0000054A  2        IF SHIFT(FOO^.WORD1,-8)=1 THEN Q:=NIL;  (*ie. C-bit-fields, no selection ==> don't go down another field list*)
0000055E  2      END   (*FOO pts to a select node.  Select a variant*)
00000562  2      ELSE Q:=NIL; (*FOO pts to a regular field or to the field list header ==> no more field list to search*)
00000566  2    END;  (*Search the field list pointed to by Q*)
0000056A  2  $PAGE$
0000056A  2  Q:=HEADER_NODE_PTR(NEXTNODE(FOO^.OFFSET_TO_TYPE));(*Pt to type node of feild or to 1st variant node of C-bit-fieldS
0000057E  2  CASE FOOTYPE OF
00000588  2  FIELD_:
00000588  2    BEGIN  (*DATA_ADDR is in a regular field or it is a selected C-bit-field*)
00000588  2    (*FOO pts to the field node, Q pts to the field's type node*)
00000588  2    EXTEND(Q^.STRUC_SIZE-1,TEMP);          (*CONVERT 16BIT STRUC_SIZE-1 TO 32 BIT TEMP*)
000005A0  2    ADD32(TEMP, FOO^.FIELD_LOCATION,MAX); (*MAX:=TYPE^.STRUC_SIZE+FOO^.FIELD_LOCATION*)
000005BC  2    IF GT(OFFSET,MAX)
000005D2  2      THEN PAD_BYTE  (*It's a pad byte at the end of the field*)
000005E2  2      ELSE
000005E2  2      BEGIN  (*It's not a pad byte*)
000005E2  2      FMTSYMBOL(PTR(ADDR(FOO^.SYMBOL)), PTR(ADDR(TEXT.ASCII[0])), TEXT.LEN,SYMBOLSIZE);
0000060C  2      LEN:=LEN+SYMBOLSIZE;
00000616  2      ADD32(STRUC_ADDR,FOO^.FIELD_LOCATION,STRUC_ADDR); (*Compute address of the field for return to calling procedure
00000636  2      P:=PTR(Q); (*Pt to the field's type node for return to calling procedure*)
0000063E  2      END;   (*It's not a pad byte*)
0000063E  2    END;   (*DATA_ADDR is in a regular field or it is a selected C-bit-field*)
00000642  2  SELECT_:
00000642  2    BEGIN     (*DATA_ADDR is a unselected C-bit-field for wich all fields should be formatted*)
00000642  2    (*FOO pts to the select node, Q pts to the first variant*)
00000642  2    WHILE Q<>NIL DO
0000064A  2      BEGIN  (*Format the next variant*)
0000064A  2      FOO:=FIELD_NODE_PTR(NEXTNODE(Q^.OFFSET_TO_FIELD));
0000065E  2      FMTSYMBOL(PTR(ADDR(FOO^.SYMBOL)), PTR(ADDR(TEXT.ASCII[0])), TEXT.LEN,SYMBOLSIZE);
00000688  2      LEN:=LEN+SYMBOLSIZE;
00000692  2      PUTCHAR(PTR(ADDR(ASCII)),LEN,",");
000006AA  2      LEN:=LEN+1;
000006B0  2      IF LEN>MAXCOLUMN THEN LEN:=MAXCOLUMN+1;
000006BE  2      Q:=HEADER_NODE_PTR(NEXTNODE(Q^.OFFSET_TO_VAR)); (*Pt to the next variant*)
000006D2  2      END;   (*Format the next variant*)
000006D6  2    LEN:=LEN-1;  (*Subtract one to clear last comma*)
000006DC  2    ADD32(STRUC_ADDR,FOO^.FIELD_LOCATION,STRUC_ADDR); (*Compute address of the field for return to calling procedure*)
000006FC  2    Q:=HEADER_NODE_PTR(NEXTNODE(FOO^.OFFSET_TO_TYPE));  (*Pt to the type node of the feild (i.e the bit field). *)
00000710  2    Q^.SELECT_VALUE:=-Q^.SELECT_VALUE; (*Compliment 3rd word for flag to FMTVAL to fmt all 16 bits*)
0000071E  2    P:=PTR(Q); (*Pt to the field's type node for return to calling procedure*)
00000726  2    END;      (*DATA_ADDR is a unselected C-bit-field for wich all fields should be formatted*)
0000072A  2  VARIANT_,RECORD_:
0000072A  2    (*FOO pts to the head of a field list, Q pts to garbage*)
0000072A  2    BEGIN     (*DATA_ADDR is pad byte preceding a variant, it occures before the first offset of the first field*)
0000072A  2    PAD_BYTE;
00000736  2    END;      (*DATA_ADDR is pad byte preceding a variant, it occures before the first offset of the first field*)
0000073A  2  OTHERWISE;
0000073A  2  END; (*END CASE*)
00000772  2
00000772  2  END; END; (*END WITH TEXT*) (*END PROCEDURE RECORDD*)
00000000  1  $PAGE$
00000000  1  $GLOBPROC OFF$
00000000  1  (**********************************************************************)
00000000  1  (*********** POINTERR NODES *******************************************)
00000000  1  (**********************************************************************)
00000000  1  (* INPUTS:                                                             *)
00000000  1  (* P                Points to data base POINTER_NODE.                   *)
00000000  1  (* RAW              Ptr to Fmgr data recrod (we need the indirect array). *)
00000000  1  (* INDIRECTS        # of indirects remaining for the variable.          *)
00000000  1  (* NEXT_INDIRECT Index to next indirection in RAW^.INDIRECT_ARRAY.      *)
00000000  1  (**********************************************************************)
00000000  1  (* OUTPUTS:                                                            *)
00000000  1  (* P                Pts to type node for field corrosponding to DATA_ADDR.*)
00000000  1  (* STRUC_ADDR       Abs adr of the struc that is the object of the pointer*)
00000000  1  (* DATA_ADDR        Abs adr of the next pointer in the new strucure.    *)
```

```
00000000  1  (*                  If there are no more pointers then this is garbage   *)
00000000  1  (* TEXT             String of formatted data.                            *)
00000000  1  (* INDIRECTS        # of indirects remaining for the variable.           *)
00000000  1  (* NEXT_INDIRECT Index to next indirection in RAW^.INDIRECT_ARRAY.       *)
00000000  1  (*************************************************************************)
00000000  1  PROCEDURE POINTERR(VAR TEXT:STRNG; VAR P:PTR; VAR DATA_ADDR:INTEGER;
00000000  2                    VAR STRUC_ADDR:INTEGER; RAW:DATAREC_PTR; VAR INDIRECTS,NEXT_INDIRECT:INT);
00000000  2  TYPE
00000000  2  POINTER_NODE=RECORD
00000000  3    WORD1           :INT;     (*NODE_TYPE IN LSB*)
00000000  3    STRUC_SIZE      :INT;     (*SIZE OF STRUCTURE IN BYTES*)
00000000  3    OFFSET_TO_TYPE  :INT;
00000000  2    END;
00000000  2  POINTER_NODE_PTR =^POINTER_NODE;
00000000  2  VAR
00000000  2  Q                 :POINTER_NODE_PTR;  (*Ptr to the POINTER_NODE in data base*)
0000077A  2  BEGIN
0000077A  2  Q:=POINTER_NODE_PTR(P);
00000782  2  STRUC_ADDR:=RAW^.INDIRECT_ARRAY[NEXT_INDIRECT].DATA;
000007A0  2  NEXT_INDIRECT:=NEXT_INDIRECT+1;
000007AA  2  INDIRECTS:=INDIRECTS-1;
000007B4  2  DATA_ADDR:=RAW^.INDIRECT_ARRAY[NEXT_INDIRECT].ADDRESS;
000007CE  2  PUTCHAR(PTR(ADDR(TEXT.ASCII)),TEXT.LEN,"^");
000007EA  2  TEXT.LEN:=TEXT.LEN+1;
000007F4  2  P:=NEXTNODE(Q^.OFFSET_TO_TYPE);
0000080A  2  END;
00000000  1  $PAGE$
00000000  1  $GLOBPROC OFF$
00000000  1  (*************************************************************************)
00000000  1  (*********** VARIABLE NODES **********************************************)
00000000  1  (*************************************************************************)
00000000  1  (* This procedure formats the outer most level of symbol name            *)
00000000  1  (* and does indirection on VAR paramaters.                                *)
00000000  1  (*************************************************************************)
00000000  1  (* INPUTS:                                                                *)
00000000  1  (* P                Ptr to data base VARIABLE_NODE.                       *)
00000000  1  (* RAW              Ptr to fmgr data recrod (we need the indirect array). *)
00000000  1  (* STRUC_ADDR       If VAR param then abs adr of the ptr to the variable  *)
00000000  1  (*                                else abs adr of the variable            *)
00000000  1  (* INDIRECTS        # of indirects remaining for the variable. VAR        *)
00000000  1  (*                  params will have at least one iff not trace statments.*)
00000000  1  (* NEXT_INDIRECT Index to 1st indirection in RAW^.INDIRECT_ARRAY.         *)
00000000  1  (*                  Used only if variable is a VAR paramater.             *)
00000000  1  (*************************************************************************)
00000000  1  (* OUTPUTS:                                                               *)
00000000  1  (* P                Pts to data base node for type of variable.           *)
00000000  1  (* STRUC_ADDR       Abs adr of the variable (VAR indirection removed)     *)
00000000  1  (* TEXT             String of formatted data.                             *)
00000000  1  (* INDIRECTS        # of indirects remaining for the variable.            *)
00000000  1  (* NEXT_INDIRECT Index to next indirection in RAW^.INDIRECT_ARRAY.        *)
00000000  1  (*************************************************************************)
00000000  1  PROCEDURE VARIABLEE(VAR TEXT:STRNG; VAR P:PTR; VAR STRUC_ADDR:INTEGER;
00000000  2                     RAW:DATAREC_PTR; VAR INDIRECTS, NEXT_INDIRECT:INT);
00000000  2  VAR
00000000  2  Q                    :DATABASE_PTR;
00000004  2  SYMBOLSIZE           :INT;
00000812  2  BEGIN
00000812  2  Q:=DATABASE_PTR(P);
0000081A  2  WITH Q^,TEXT DO
00000828  2    BEGIN
00000828  2    FMTSYMBOL(PTR(ADDR(IDENTIFIER)),PTR(ADDR(TEXT.ASCII[0])),TEXT.LEN,SYMBOLSIZE);
0000084E  2    LEN:=LEN+SYMBOLSIZE;
00000858  2    P:=NEXTNODE(OFFSET_TO_TYPE);  (*SET P TO POINT TO TYPE NODE*)
0000086E  2    END;
0000086E  2  IF (SHIFT(SHIFT(Q^.FLAGS,11),-15)<>0) AND (INDIRECTS>0) THEN
0000089C  2    BEGIN (*It is a VAR paramater and we can do the indirection*)
0000089C  2    STRUC_ADDR:=RAW^.INDIRECT_ARRAY[NEXT_INDIRECT].DATA;
000008BA  2    NEXT_INDIRECT:=NEXT_INDIRECT+1;
000008C4  2    INDIRECTS:=INDIRECTS-1;
000008CE  2    END;  (*It is a VAR paramater and we can do the indirection*)
000008CE  2  END; (*END PROCEDURE VARIABLE*)(*P pts to NODE for type of variable*)
00000000  1  $PAGE$
```

```
00000000 1 $GLOBPROC ON$
00000000 1 (***************************************************************************)
00000000 1 (********** FMTSYM *********************************************************)
00000000 1 (***************************************************************************)
00000000 1 (* Given the absolute address of the whole structure, and an address       *)
00000000 1 (* within the structure, traverse the data base information                *)
00000000 1 (* to find the absolute address of the terminal structure which            *)
00000000 1 (* the DATA_ADDR and format symbol information for the terminal            *)
00000000 1 (* structure.                                                              *)
00000000 1 (***************************************************************************)
00000000 1 (* INPUTS:                                                                 *)
00000000 1 (* P           Ptr to data base VARIABLE_NODE.                             *)
00000000 1 (* BYTE_INDEX  Which byte in RAW^.BUSS_ADDR.                               *)
00000000 1 (* STRUC_ADDR  Absolute address of the whole structure.                    *)
00000000 1 (* BUSS_ADDR   Absolute address of the current data byte (from RAW^).      *)
00000000 1 (* LANGUAGE    0=Pascal, 1=C.                                              *)
00000000 1 (* RAW         Pts to footdc data record.                                  *)
00000000 1 (***************************************************************************)
00000000 1 (* OUTPUTS:                                                                *)
00000000 1 (* P           Points to terminal structure's data base node  i.e. a      *)
00000000 1 (*             SCALAR_, SUBRANGE_, PTR_, SET_, REAL_ or CHARACTER_ node*)
00000000 1 (* STRUC_ADDR  Absolute address of the terminal structrue.                 *)
00000000 1 (* STRUC_SIZE  # bytes in the terminal structrue  (pad==> 1 byte).         *)
00000000 1 (* TEXT        String of formatted data.                                   *)
00000000 1 (* PAD         TRUE  if DATA_ADDR is address of a pad byte.                *)
00000000 1 (***************************************************************************)
00000000 1 PROCEDURE FMTSYM  (VAR TEXT:STRNG; VAR P:PTR; BUSS_ADDR:INTEGER; LANGUAGE:INT;
00000000 2                    VAR  STRUC_ADDR:INTEGER; BYTE_INDEX:INT; VAR STRUC_SIZE:INT; VAR PAD:BOOLEAN; RAW:DATAREC_PTR);
00000000 2 TYPE
00000000 2 GENERIC_NODE=RECORD
00000000 3   SIZE_TYPE       :INT; (*MSB=SIZE OF NODE (IFF VARIABLE SIZE), LSB=TYPE OF NODE*)
00000000 3   STRUC_SIZE      :INT;
00000000 2   END;
00000000 2 GENERIC_NODE_PTR  =^GENERIC_NODE;
00000000 2 VAR
00000000 2 DATA_ADDR         :INTEGER;
00000004 2 Q                 :GENERIC_NODE_PTR; (*PTR INTO DATA BASE*)
00000008 2 MORE              :BOOLEAN;          (*True if more TEXT to format*)
00000009 2 PTRSYM            :BOOLEAN;          (*True if TEXT contains some sort of pointer expression*)
0000000A 2 INDIRECTS0        :INT;              (*Number of levels of indirection associated with ms data byte*)
0000000C 2 INDIRECTS1        :INT;              (*Number of levels of indirection associated with ls data byte*)
0000000E 2 INDIRECTS         :INT;              (*Number of levels of indirection (one of the above two cases) *)
00000010 2 NEXT_INDIRECT     :INT;              (*Index to next indirect in RAW^.INDIRECT_ARRAY*)
00000012 2 $PAGE$
000008D6 2 BEGIN
000008D6 2 PTRSYM:=FALSE; (*No ptr expression in TEXT so far*)
000008DA 2 INDIRECTS0:=SHIFT(RAW^.INDIRECTS,-8);          (*Get # of levels of indirction for variable in high byte*)
000008E8 2 INDIRECTS1:=SHIFT(SHIFT(RAW^.INDIRECTS,3),-3); (*Get # of levels of indirction for variable in high byte*)
000008F4 2 IF BYTE_INDEX=0
000008FC 2   THEN IF INDIRECTS0=0FFH
00000904 2     THEN BEGIN INDIRECTS:=INDIRECTS1; NEXT_INDIRECT:=1; END
00000912 2     ELSE BEGIN INDIRECTS:=INDIRECTS0; NEXT_INDIRECT:=1; END
00000922 2   ELSE IF INDIRECTS1=0FFH
0000092E 2     THEN BEGIN INDIRECTS:=INDIRECTS0; NEXT_INDIRECT:=1; END
0000093E 2     ELSE BEGIN INDIRECTS:=INDIRECTS1; NEXT_INDIRECT:=INDIRECTS0+1; END;
0000094E 2 IF RAW^.TYP=STATEMENTS_ THEN INDIRECTS:=0; (*If statements then there is no indirect array*)
00000962 2
00000962 2 TEXT.LEN:=0; (*INITIALIZE TEXT.ASCII CHARACTER COUNTER*)
00000968 2 VARIABLEE (TEXT,P,STRUC_ADDR,RAW,INDIRECTS,NEXT_INDIRECT); (*Fmt paramater name*)
00000992 2 IF INDIRECTS>0  (*Are there more indirects?*)
0000099A 2   THEN DATA_ADDR:=RAW^.INDIRECT_ARRAY[NEXT_INDIRECT].ADDRESS  (*Yes: DATA_ADDR:=location of 1st pointer*)
000009B4 2   ELSE DATA_ADDR:=BUSS_ADDR;                                   (*No:  DATA_ADDR:=location of final data read*)
000009BA 2 PAD:=FALSE;
000009C0 2 MORE:=TRUE;
000009C6 2 WHILE (MORE) AND (NOT PAD) DO
000009DA 2   BEGIN (*Look at the next struc.  If it is an array, record or pointer with indirect information then format it.*)
000009DA 2   CASE SHIFT(SHIFT(P^,8),-8) OF  (*CASE on the node type of P^*)
000009EE 2     ARRAY_    :ARRAYY    (TEXT,P,DATA_ADDR,STRUC_ADDR,PAD);      (*Fmt array indexes, rtn ptr to element type node*)
00000A1A 2     RECORD_   :RECORDD   (TEXT,P,DATA_ADDR,STRUC_ADDR,PAD);      (*Fmt field name, rtn ptr to field type node*)
00000A46 2     POINTER_  :IF INDIRECTS<=0
00000A4E 2                  THEN MORE:=FALSE (*No more indirects ==> cant do pointer*)
00000A56 2                  ELSE
00000A56 2                  BEGIN
00000A56 2                  PTRSYM:=TRUE; (*TEXT is a pointer expression of some sort*)
00000A5C 2                  POINTERR(TEXT,P,DATA_ADDR,STRUC_ADDR,RAW,INDIRECTS,NEXT_INDIRECT);(*Fmt "^", rtn ptr to object type*
00000A8A 2                  IF INDIRECTS=0 THEN DATA_ADDR:=BUSS_ADDR; (*DATA_ADDR:=location of final data read*)
```

```
00000A98  2                END;
00000A9C  2       OTHERWISE MORE:=FALSE; (*The node type is a teninal structure, ie integer, scalar, real, ect.*)
00000AA0  2       END; (*CASE*)
00000ACC  2    IF TEXT.LEN>MAXCOLUMN THEN TEXT.LEN:=MAXCOLUMN+1; (*TEXT is 20 chars bigger than maxcolumn for overflow*)
00000AE2  2    END;  (*Look at the next struc.  If it is an array, record or pointer with indirect information then format it.*)
00000AE6  2  Q:=GENERIC_NODE_PTR(P); (*Do type change so we can find STRUC_SIZE*)
00000AEE  2  IF PAD THEN STRUC_SIZE:=1 ELSE STRUC_SIZE:=Q^.STRUC_SIZE;
00000B10  2  IF (PTRSYM) AND (LANGUAGE=1) THEN C_PTR(TEXT); (*Convert Pascal ptr expression to C ptr expression*)
00000B36  2  END;.

End of compilation, number of errors=    0

00000000  1  "68000" PREPROCESS
00000000  1  #DEFINE M68000 TRUE
00000000  1  (*****************************************************************************************)
00000000  1  (**********  FMTVAL  *********************************************************************)
00000000  1  (*****************************************************************************************)
00000000  1  (* ROUTINES FOR FORMATTING SYMBOL VALUES INTO VBUFF                                      *)
00000000  1  (*****************************************************************************************)
00000000  1  PROGRAM PFMTVAL;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1
00000000  1  #IF M68000
00000000  1  CONST
00000000  1  (* BASE VALUES FOR BASE CHANGE *)
00000000  1  BIN            =1;
00000000  1  OCT            =2;
00000000  1  DEC            =3;
00000000  1  HEX            =4;
00000000  1  ASCII          =0;
00000000  1  DEFAULT        =6;
00000000  1  #ENDIF
00000000  1  $EXTVAR ON$
00000000  1  VAR ENVIRONMENT:ENVIRONMENT_PTR;
00000000  1  $EXTVAR OFF$
00000000  1
00000000  1
00000000  1
00000000  1  (*****************************************************************************************)
00000000  1  (**********  EXTERNAL PROCEDURES ********************************************************)
00000000  1  (*****************************************************************************************)
00000000  1  FUNCTION  GE            (OP1,OP2:INTEGER):BOOLEAN; EXTERNAL;
00000000  1  FUNCTION  LE            (OP1,OP2:INTEGER):BOOLEAN; EXTERNAL;
00000000  1  FUNCTION  GT            (OP1,OP2:INTEGER):BOOLEAN; EXTERNAL;
00000000  1  FUNCTION  LT            (OP1,OP2:INTEGER):BOOLEAN; EXTERNAL;
00000000  1  FUNCTION  NEXTNODE      (VAR OFFSET:INT):PTR; EXTERNAL;
00000000  1  FUNCTION  INC_PTR       (P:PTR; INC:INT):PTR; EXTERNAL;
00000000  1  PROCEDURE FMTSYMBOL     (SOURCE,DEST:PTR; DEST_OFFSET:INT; VAR LEN:INT);EXTERNAL;
00000000  1  PROCEDURE FORMATREAL    (VAR STRUC:STRUC_TYPE; VAR TEXT:STRNG; SIZE:INT);EXTERNAL;
00000000  1  PROCEDURE MOVEBYTES     (SOURCE:PTR; SOURCE_OFFSET:INT; DEST:PTR; DEST_OFFSET:INT; COUNT:INT); EXTERNAL;
00000000  1  PROCEDURE PUTCHAR       (DEST:PTR; DEST_OFFSET:INT; CHARACTER:CHAR); EXTERNAL;
00000000  1  PROCEDURE GETCHAR       (SOURCE:PTR; SOURCE_OFFSET:INT; VAR CHARACTER:CHAR); EXTERNAL;
00000000  1  PROCEDURE FORMAT        (SIGN_FLAG:INT;SOURCE:PTR; SOURCESIZE:INT;
00000000  2                          DEST:PTR; DEST_OFFSET:INT; VAR DESTSIZE:INT; BASE:INT; JUSTIFY:INT); EXTERNAL;
00000000  1  #IF M68000
00000000  1  PROCEDURE LONG_FMT     (VAR STRUC:STRUC_TYPE; STRUCSIZE:INT;
00000000  2                         DEST:PTR; DEST_OFFSET:INT; VAR DESTSIZE:INT; BASE:INT); EXTERNAL;
00000000  1  PROCEDURE CURRENT_BASE  (VAR BASE:INT);EXTERNAL;
00000000  1  PROCEDURE OUTIT         (LETTER:CHAR;VALUE:INT;BASE:CHAR); EXTERNAL;
00000000  1  #ENDIF
00000000  1  $PAGE$
00000000  1  $GLOBPROC OFF$
00000000  1  (*****************************************************************************************)
00000000  1  (**********  ILLEGAL VALUE (SCALERS AND SUBRANGES)***************************************)
00000000  1  (*****************************************************************************************)
00000000  1  (* A SCALAR, SUBRANGE OR CHAR VALUE IS ILLEGAL.  OUTPUT VALUE IN HEX ALONG WITH "?".  *)
00000000  1  (*****************************************************************************************)
00000000  1  (* INPUTS                                                                                *)
00000000  1  (* VALUE        A 4 byte representation of the data that is out of range                 *)
00000000  1  (* STRUC_SIZE   The size of the structure that value represents (1,2 or 4 bytes).        *)
00000000  1  (*****************************************************************************************)
```

```
00000000  1  (* OUTPUTS                                                                          *)
00000000  1  (* TEXT         Character array of the formatted data.                              *)
00000000  1  (***********************************************************************************)
00000000  1  PROCEDURE ILLEGAL_VALUE(VALUE:INTEGER;STRUC_SIZE:INT;VAR TEXT:STRNG);
00000000  2  VAR
00000000  2  DESTSIZE :INT;
00000004  2
00000004  2  BEGIN
00000004  2  DESTSIZE:=STRUC_SIZE*2+1;
00000012  2  FORMAT(UNSIGNED,PTR(ADDR(VALUE)),4,PTR(ADDR(TEXT.ASCII)),TEXT.LEN,DESTSIZE,16,RIGHT);
00000048  2  TEXT.LEN:=TEXT.LEN+DESTSIZE;
00000052  2  PUTCHAR(PTR(ADDR(TEXT.ASCII)),TEXT.LEN,"?");
0000006E  2  TEXT.LEN:=TEXT.LEN+1;
00000078  2  END;
00000000  1  $PAGE$
00000000  1  $GLOBPROC OFF$
00000000  1  (***********************************************************************************)
00000000  1  (**********  STRUC_TO_INTEGER*******************************************************)
00000000  1  (***********************************************************************************)
00000000  1  (* CONVERT LEFT JUSTIFIED DATA IN STRUC TO RIGHT JUSTIFIED PACKED DATA IN RESULT      *)
00000000  1  (***********************************************************************************)
00000000  1  (* INPUTS                                                                           *)
00000000  1  (* STRUC          A 32 byte array containing the raw value of the variable.         *)
00000000  1  (*                variables smaller than 32 bytes are left justified.               *)
00000000  1  (*                STRUC is packed in 68000, unpacked in GPC.                        *)
00000000  1  (* P              Pointer to data base SUBRANGE_NODE, SCALAR_NODE, FUNDAMENTAL_NODE  *)
00000000  1  (*                or BIT_NODE.                                                      *)
00000000  1  (***********************************************************************************)
00000000  1  (* OUTPUTS                                                                          *)
00000000  1  (* RESULT         4 byte form of the value that was in STRUC.                       *)
00000000  1  (***********************************************************************************)
00000000  1  PROCEDURE STRUC_TO_INTEGER(VAR STRUC:STRUC_TYPE; VAR RESULT:INTEGER; P:PTR);
00000000  2  TYPE
00000000  2  GENERIC_NODE=RECORD
00000000  3    WORD1          :INT;       (*NODE TYPE IN LSB*)
00000000  3    STRUC_SIZE     :INT;
00000000  3    OFFSET_TO_TYPE :INT;       (*SUBRANGE NODES ONLY*)
00000000  3    MINIMUM        :INTEGER;   (*SUBRNAGE NODES ONLY*)
00000000  3    MAXIMUM        :INTEGER;   (*SUBRANGE NODES ONLY*)
00000000  2    END;
00000000  2  GENERIC_NODE_PTR  =^GENERIC_NODE;
00000000  2  VAR
00000000  2  NODE_TYPE :INT;
00000002  2  Q         :GENERIC_NODE_PTR;
00000006  2  SIGN_FLAG :INT;
00000008  2  I         :INT;
00000080  2
00000080  2  BEGIN
00000080  2  Q:=GENERIC_NODE_PTR(P);
00000086  2  NODE_TYPE:=SHIFT(SHIFT(P^,8),-8);  (*GET LS BYTE*)
00000094  2  CASE NODE_TYPE OF
0000009C  2    SCALAR_,
0000009C  2    BIT_          :SIGN_FLAG:=UNSIGNED;
000000A6  2    SUBRANGE_,
000000A6  2    FUNDAMENTAL_ :IF SHIFT(Q^.WORD1,-8)=1 THEN SIGN_FLAG:=SIGNED ELSE SIGN_FLAG:=UNSIGNED;  (*UNSIGNED 32 BIT COMPARE*)
000000CA  2    OTHERWISE;
000000CA  2    END; (*END CASE*)
00000104  2  IF(SIGN_FLAG=SIGNED) AND (SHIFT(STRUC[0],-7)<>0)
00000128  2    THEN BEGIN RESULT[0]:=-1; RESULT[1]:=-1; END   (*SET ALL 32 BITS TO 1*)
0000013E  2    ELSE BEGIN RESULT[0]:= 0; RESULT[1]:= 0; END;  (*SET ALL 32 BITS TO 0*)
0000014C  2  #IF NOT M68000
0000014C  2  FOR I:=0 TO 3 DO PUTCHAR(PTR(ADDR(STRUC)),I,CHAR(STRUC[I])); (*PACK: STRUC_SIZE<= 4 BYTES*)
0000014C  2  #ENDIF
0000014C  2  MOVEBYTES (PTR(ADDR(STRUC)),0,   PTR(ADDR(RESULT)),4-Q^.STRUC_SIZE,  Q^.STRUC_SIZE);  (*PLAIN OLD MOVE IF 68000*)
0000017A  2  END;
00000000  1  $PAGE$
00000000  1  $GLOBPROC ON$
00000000  1  (***********************************************************************************)
00000000  1  (**********  FUNDAMENTAL INTEGER *****************************************************)
00000000  1  (***********************************************************************************)
00000000  1  (* FORMAT FUNDAMENTAL INTEGER                                                       *)
00000000  1  (***********************************************************************************)
00000000  1  (* INPUTS                                                                           *)
00000000  1  (* SIGN_FLAG    0 (C)      ==> Determin if value is signed by looking in INTEGER_NODE. *)
00000000  1  (*              1 (PASCAL ==> VALUE is already known to be signed.                  *)
```

```
00000000  1  (*                2 (PASCAL)==> VALUE is already known to be unsigned.              *)
00000000  1  (* VALUE          4 byte representation of the data to be formatted.                 *)
00000000  1  (* P              Pointer to data base INTEGER NODE (type 17)                        *)
00000000  1  (*                First byte of node=0 (PASCAL)==> use SIGN_FLAG to determin if signed. *)
00000000  1  (*                First byte of node=1 (C)      ==> signed                           *)
00000000  1  (*                First byte of node=2 (C)      ==> unsigned                         *)
00000000  1  (***********************************************************************************)
00000000  1  (* OUTPUTS                                                                          *)
00000000  1  (* TEXT           Character array of the formatted data.                            *)
00000000  1  (***********************************************************************************)
00000000  1  PROCEDURE FUNDAMENTAL(VALUE:INTEGER; VAR TEXT:STRNG; P:PTR; SIGN_FLAG:INT);
00000000  2  TYPE
00000000  2  INTEGER_NODE=RECORD
00000000  3    WORD1           :INT;
00000000  3    SIZE            :INT;
00000000  2    END;
00000000  2  INTEGER_NODE_PTR=^INTEGER_NODE;
00000000  2
00000000  2  VAR
00000000  2  Q            :INTEGER_NODE_PTR;
00000004  2  CHARCOUNT    :INT;
00000182  2
00000182  2  BEGIN
00000182  2  Q:=INTEGER_NODE_PTR(P);
00000188  2  IF SIGN_FLAG=0 THEN SIGN_FLAG:=SHIFT(Q^.WORD1,-8); (* If SIGN_FLAG is unknown, get it from the INTEGER_NODE.*)
0000019C  2  CHARCOUNT:=10;
000001A2  2  FORMAT(SIGN_FLAG,PTR(ADDR(VALUE)),4,PTR(ADDR(TEXT.ASCII)),TEXT.LEN,CHARCOUNT,10,LEFT);
000001D6  2  TEXT.LEN:=TEXT.LEN+CHARCOUNT; (* NUMBER OF LEFT JUSTIFIED CHARACTERS RETURNED IN CHARCOUNT*)
000001E0  2  END;
00000000  1  $PAGE$
00000000  1  $GLOBPROC ON$
00000000  1  (***********************************************************************************)
00000000  1  (**********  SCALAR  *****************************************************************)
00000000  1  (***********************************************************************************)
00000000  1  (* FORMAT SCALAR                                                                    *)
00000000  1  (***********************************************************************************)
00000000  1  (* INPUTS                                                                           *)
00000000  1  (* VALUE          4 byte representation of the data to be formatted.                 *)
00000000  1  (* P              Pointer to data base SCALAR_NODE.                                  *)
00000000  1  (***********************************************************************************)
00000000  1  (* OUTPUTS                                                                          *)
00000000  1  (* TEXT           Character array of the formatted data.                            *)
00000000  1  (***********************************************************************************)
00000000  1  PROCEDURE SCALAR(VALUE:INTEGER; VAR TEXT:STRNG; P:PTR);
00000000  2  TYPE
00000000  2  SUBNODE=RECORD
00000000  3    VALUE           :INTEGER;
00000000  3    ASCII           :ARRAY[0..7] OF INT;
00000000  2    END;
00000000  2  SUBNODE_PTR=^SUBNODE;
00000000  2  SCALAR_NODE=RECORD
00000000  3    WORD1           :INT; (*NODE_TYPE IN LSB*)
00000000  3    STRUC_SIZE      :INT;
00000000  3    NODE_SIZE       :INT;
00000000  3    DATA            :SUBNODE;
00000000  2    END;
00000000  2  SCALAR_NODE_PTR=^SCALAR_NODE;
00000000  2
00000000  2  VAR
00000000  2  Q            :SCALAR_NODE_PTR;
00000004  2  FOO          :SUBNODE_PTR;     (*PT TO THE CURRENT SUBNODE*)
00000008  2  MAX          :SUBNODE_PTR;     (*PT TO FIRST BYTE PAST SCALAR NODE*)
0000000C  2  SUBNODESIZE  :INT;             (*NO OF WORDS IN CURRENT SUBNODE*)
0000000E  2  CHARCOUNT    :INT;             (*NO OF CHARACTERS FORMATTED*)
000001E8  2
000001E8  2  BEGIN
000001E8  2  Q:=SCALAR_NODE_PTR(P);
000001EE  2  MAX:=SUBNODE_PTR(INC_PTR(PTR(Q),Q^.NODE_SIZE*MULTIPLIER));     (*MULTIPLIER=1 FOR BPC, 2 FOR 68000*)
0000020C  2  FOO:=SUBNODE_PTR(ADDR(Q^.DATA));
00000218  2  WHILE (FOO<>MAX) AND (VALUE<>FOO^.VALUE) DO
0000023C  2    BEGIN
0000023C  2    SUBNODESIZE:=SHIFT(FOO^.ASCII[0],-13)+3;                      (*SUBNODESIZE in words*)
00000252  2    FOO:=SUBNODE_PTR(INC_PTR(PTR(FOO),SUBNODESIZE*MULTIPLIER)); (*MULTIPLIER=1 for bpc, 2 for 68000*)
00000266  2    END;
```

```
00000268 2
00000268 2 (*FOO POINTS TO THE CORRECT SUBNODE OR THE VALUE IS OUT OF RANGE*)
00000268 2 IF FOO<>MAX THEN
00000274 2   BEGIN (*VALUE IS IN RANGE*)
00000274 2   FMTSYMBOL(PTR(ADDR(FOO^.ASCII)), PTR(ADDR(TEXT.ASCII[0])), TEXT.LEN, CHARCOUNT);
0000029E 2   TEXT.LEN:=TEXT.LEN+CHARCOUNT;
000002A8 2   END  (*VALUE IS IN RANGE*)
000002AC 2   ELSE ILLEGAL_VALUE(VALUE,Q^.STRUC_SIZE,TEXT);
000002CA 2 (*TEXT is 20 characters bigger then MAXCOLUMN.*)
000002CA 2 (*If it gets bigger then MAXCOLUMN, lop it off but continue looping in order to get atomic strucure type*)
000002CA 2 IF TEXT.LEN>MAXCOLUMN THEN TEXT.LEN:=MAXCOLUMN+1;
000002E0 2 END;
00000000 1 $PAGE$
00000000 1 $GLOBPROC ON$
00000000 1 (*******************************************************************************)
00000000 1 (**********  SUBRANGE  ***********************************************************)
00000000 1 (*******************************************************************************)
00000000 1 (* FORMAT SUBRANGE: A SUBRANGE IS EITHER A SUBRANGE OF A SCALAR OR OF          *)
00000000 1 (* THE BASIC INTEGER MININT..MAXINT i.e. THE GENERIC INTEGER.                  *)
00000000 1 (*******************************************************************************)
00000000 1 (* INPUTS                                                                       *)
00000000 1 (* VALUE        4 byte representation of the data to be formatted.            *)
00000000 1 (* P            Pointer to data base SUBRANGE_NODE.                            *)
00000000 1 (*******************************************************************************)
00000000 1 (* OUTPUTS                                                                      *)
00000000 1 (* TEXT         Character array of the formatted data.                        *)
00000000 1 (*******************************************************************************)
00000000 1 PROCEDURE SUBRANGE(VALUE:INTEGER; VAR TEXT:STRNG; P:PTR);
00000000 2 LABEL 1;
00000000 2 TYPE
00000000 2 SUBRANGE_NODE=RECORD
00000000 3   WORD1          :INT; (*NODE_TYPE IN LSB*)
00000000 3   STRUC_SIZE     :INT;
00000000 3   OFFSET_TO_TYPE :INT;
00000000 3   MINIMUM        :INTEGER;
00000000 3   MAXIMUM        :INTEGER;
00000000 2   END;
00000000 2 SUBRANGE_NODE_PTR=^SUBRANGE_NODE;
00000000 2 VAR
00000000 2 Q         :SUBRANGE_NODE_PTR; (*PTR TO CURRENT SUBRANGE NODE*)
00000004 2 SIGN_FLAG :INT;              (*0=unknown, 1=VALUE is signed, 2=VALUE is unsigned.*)
000002E8 2
000002E8 2 BEGIN
000002E8 2 Q:=SUBRANGE_NODE_PTR(P);
000002EE 2 P:=NEXTNODE(Q^.OFFSET_TO_TYPE);  (*P PTS TO TYPE OF SUBRANGE*)
00000302 2 WITH Q^ DO BEGIN
00000308 2
00000308 2 (**********DO A RANGE CHECK **************************)
00000308 2 IF LT(MINIMUM,MAXIMUM) THEN
00000322 2   BEGIN   (*RANGE IS CONTIGUAS WITH NO WRAP AROUND ZERO==> UNSIGNED*)
00000322 2   IF (LT(VALUE,MINIMUM)) OR  (GT(VALUE,MAXIMUM)) THEN   (*UNSIGNED 32BIT COMPARES*)
00000358 2     BEGIN ILLEGAL_VALUE(VALUE,STRUC_SIZE,TEXT);  GOTO 1; END;
0000037A 2   END     (*RANGE IS CONTIGUOUS WITH NO WRAP AROUND ZERO*)
0000037E 2   ELSE
0000037E 2   BEGIN   (*RANGE WRAPS AROUND ZERO==> SIGNED*)
0000037E 2   IF (LT(VALUE,MINIMUM)) AND (GT(VALUE,MAXIMUM)) THEN    (*UNSIGNED 32BIT COMPARES*)
000003B4 2     BEGIN ILLEGAL_VALUE(VALUE,STRUC_SIZE,TEXT);  GOTO 1; END;
000003D6 2   END;    (*RANGE WRAPS AROUND ZERO*)
000003D6 2
000003D6 2 (********** IT WAS IN RANGE SO FORMAT IT ***************)
000003D6 2 IF P^=SCALAR_
000003E4 2   THEN SCALAR (VALUE,TEXT,P)
00000402 2   ELSE
00000402 2   BEGIN
00000402 2   SIGN_FLAG:=SHIFT(Q^.WORD1,-8); (*If I'm here, it must be PASCAL==> SIGN_FLAG in first byte of SUBRANGE_NODE*)
0000040E 2   FUNDAMENTAL(VALUE,TEXT,P,SIGN_FLAG); (*It is the basic integer*)
0000042A 2   END;
0000042A 2 (*TEXT is 20 characters bigger then MAXCOLUMN.*)
0000042A 2 (*If it gets bigger then MAXCOLUMN, lop it off but continue looping in order to get atomic strucure type*)
0000042A 2 1:IF TEXT.LEN>MAXCOLUMN THEN TEXT.LEN:=MAXCOLUMN+1;
00000440 2 END;END;  (*END WITH*)   (*END PROCEDURE SUBRANGE*)
00000000 1 $PAGE$
00000000 1 $IF M68000
00000000 1 $GLOBPROC OFF$
00000000 1 (*******************************************************************************)
00000000 1 (**********  SCALAR_TEST  ********************************************************)
```

```
00000000  1  (******************************************************************************)
00000000  1  (* CALLED IN THE CASE OF A REQUEST FOR A BASE CHANGE INTO DECIMAL AND IT IS OF TYPE   *)
00000000  1  (* SUBRANGE. THIS PROCEDURE WILL TEST TO SEE IF IT IS A SCALAR                        *)
00000000  1  (******************************************************************************)
00000000  1  (* INPUTS                                                                              *)
00000000  1  (* VALUE        4 byte representation of the data to be formatted.                     *)
00000000  1  (* P            Pointer to data base SUBRANGE_NODE.                                    *)
00000000  1  (******************************************************************************)
00000000  1  (* OUTPUTS                                                                             *)
00000000  1  (* SCALAR_TEST  TRUE if this is a scalar subrange.                                     *)
00000000  1  (******************************************************************************)
00000000  1  FUNCTION SCALAR_TEST(VALUE:INTEGER;P:PTR):BOOLEAN;
00000000  2  TYPE
00000000  2  SUBRANGE_NODE=RECORD
00000000  3    WORD1          :INT; (*NODE_TYPE IN LSB*)
00000000  3    STRUC_SIZE     :INT;
00000000  3    OFFSET_TO_TYPE :INT;
00000000  3    MINIMUM        :INTEGER;
00000000  3    MAXIMUM        :INTEGER;
00000000  2    END;
00000000  2  SUBRANGE_NODE_PTR=^SUBRANGE_NODE;
00000001  2  VAR
00000001  2  Q          :SUBRANGE_NODE_PTR; (*PTR TO CURRENT SUBRANGE NODE*)
00000448  2
00000448  2  BEGIN
00000448  2  Q:=SUBRANGE_NODE_PTR(P);
0000044E  2  P:=NEXTNODE(Q^.OFFSET_TO_TYPE);  (*P PTS TO TYPE OF SUBRANGE*)
00000462  2  IF P^=SCALAR_
00000470  2    THEN SCALAR_TEST:= TRUE
0000047A  2    ELSE SCALAR_TEST:= FALSE;
0000047E  2  END;
00000000  1  $PACES
00000000  1  #ENDIF
00000000  1  $GLOBPROC OFF$
00000000  1  (******************************************************************************)
00000000  1  (*********** SETT ************************************************************)
00000000  1  (******************************************************************************)
00000000  1  (* A formatted set is potentialy 256 elements of 15 characters + commas (4097 chars)  *)
00000000  1  (* before an element is formatted I check to see if I am within 16 charactes of the   *)
00000000  1  (* end of the TEXT string, if so I stop formatting as not to overflow TEXT.            *)
00000000  1  (******************************************************************************)
00000000  1  (* INPUTS                                                                              *)
00000000  1  (* STRUC        A 32 byte array containing the raw value of the set.                   *)
00000000  1  (*              Sets smaller then 32 bytes are left justified in STRUC.                *)
00000000  1  (* P            Pointer to the data base SET_NODE.                                     *)
00000000  1  (******************************************************************************)
00000000  1  (* OUTPUTS                                                                             *)
00000000  1  (* TEXT         Character array of the formatted data.                                 *)
00000000  1  (******************************************************************************)
00000000  1  PROCEDURE SETT(VAR STRUC:STRUC_TYPE; VAR TEXT:STRNG; P:PTR);
00000000  2  LABEL 1;
00000000  2  TYPE
00000000  2  SETT_NODE=RECORD
00000000  3    WORD1          :INT; (*NODE_TYPE IN LSB*)
00000000  3    STRUC_SIZE     :INT;
00000000  3    OFFSET_TO_TYPE :INT;
00000000  2    END;
00000000  2  SETT_NODE_PTR=^SETT_NODE;
00000000  2  VAR
00000000  2  Q              :SETT_NODE_PTR;
00000004  2  SMALL          :BYTE;    (*CURRENT BYTE OF SET WE ARE TRYING TO FORMAT*)
00000005  2  I              :INT;     (*INDEX INTO STRUC *)
00000008  2  J              :INT;     (*SHIFT COUNTER*)
0000000A  2  ELEMENT_NO     :INT;     (*THE PARTICULAR ELEMENT OF INTEREST SAME AS BIT #*)
0000000C  2  VALUE          :INTEGER; (*INTEGER form of ELEMENT_NO, paramater for SCALAR_TO_SUBRANGE*)
00000010  2  CHARACTER      :CHAR;
0000048C  2
0000048C  2  BEGIN
0000048C  2  Q:=SETT_NODE_PTR(P);
00000492  2  P:=NEXTNODE(Q^.OFFSET_TO_TYPE);  (*P PTS TO TYPE OF SET ELEMENT NODE*)
000004A6  2  PUTCHAR(PTR(ADDR(TEXT.ASCII)),TEXT.LEN,"[");
000004C2  2  TEXT.LEN:=TEXT.LEN+1;
000004CC  2  ELEMENT_NO:=0;                (*START LOOKING AT ELEMENT 0*)
000004D0  2  FOR I:=0 TO Q^.STRUC_SIZE-1 DO
000004EA  2    BEGIN (*GET THE NEXT BYTE*)
000004EA  2    SMALL:=STRUC[I];  (*SMALL IS ONE BYTE OF THE SET VALUE*)
```

```
000004F8 2     FOR J:=0 DOWNTO -7 DO
000004FC 2       BEGIN (*Look at one bit of the byte, starting with the LS bit*)
000004FC 2       IF SHIFT(SMALL,J) MOD 2 <> 0  THEN
0000052A 2         BEGIN (*THE BIT IS SET ==> THE ELEMENT IS PART OF THE SET*)
0000052A 2         VALUE[0]:=0;              (*Convert 16 bit ELEMENT_NO to 32 bit VALUE*)
0000052E 2         VALUE[1]:=ELEMENT_NO;     (*Convert 16 bit ELEMENT_NO to 32 bit VALUE*)
00000534 2         IF P^=SCALAR_
00000542 2           THEN SCALAR    (VALUE,TEXT,P)  (*TEXT.LEN return value <= MAXCOLUMN+1*)
00000560 2           ELSE SUBRANGE (VALUE,TEXT,P); (*TEXT.LEN return value <= MAXCOLUMN+1*)
0000057A 2         PUTCHAR(PTR(ADDR(TEXT.ASCII)),TEXT.LEN,",");
00000596 2         TEXT.LEN:=TEXT.LEN+1;
000005A0 2         END;  (*THE BIT IS SET ==> THE ELEMENT IS PART OF THE SET*)
000005A0 2       ELEMENT_NO:=ELEMENT_NO+1;
000005A4 2       END;  (*Look at one bit of the byte, starting with the LS bit*)
000005B6 2    END; (*GET THE NEXT BYTE*)
000005CA 2  GETCHAR(PTR(ADDR(TEXT.ASCII)),TEXT.LEN-1,CHARACTER);
000005EE 2  IF CHARACTER="," THEN TEXT.LEN:=TEXT.LEN-1;
00000604 2  PUTCHAR(PTR(ADDR(TEXT.ASCII)),TEXT.LEN,"]");
00000620 2  TEXT.LEN:=TEXT.LEN+1;
0000062A 2  1:END;
00000000 1  $PAGE$
00000000 1  $GLOBPROC OFF$
00000000 1  (*****************************************************************************)
00000000 1  (**********  CHARR ***********************************************************)
00000000 1  (*****************************************************************************)
00000000 1  (* Format a character.                                                       *)
00000000 1  (* Characters with values 00H-19H are control characters and are displayed as XXH.  *)
00000000 1  (* Characters with values 80H-FFH ara not ascii and are displayed as XXH?.          *)
00000000 1  (* The BPC and 68000 are totaly incompatable in the way they handle bytes, signed vrs *)
00000000 1  (* unsigned types and type conversions.  STRUC[0] is converted to a 16 bit type and  *)
00000000 1  (* shifted around in order to get it into a common form for both processors.        *)
00000000 1  (*****************************************************************************)
00000000 1  (* INPUTS                                                                    *)
00000000 1  (* STRUC        A 32 byte array containing the character in byte 0.          *)
00000000 1  (*****************************************************************************)
00000000 1  (* OUTPUTS                                                                   *)
00000000 1  (* TEXT         Character array of the formatted data.                       *)
00000000 1  (*****************************************************************************)
00000000 1  PROCEDURE CHARR(VAR STRUC:STRUC_TYPE; VAR TEXT:STRNG);
00000000 2  VAR
00000000 2  TEMP:INTEGER;
00000004 2  C   :INT;
00000632 2  BEGIN
00000632 2  C:=STRUC[0];              (*Make the character look the same to BPC and 68000*)
0000063E 2  C:=SHIFT(SHIFT(C,8),-8); (*Make the character look the same to BPC and 68000*)
00000646 2  IF (C < 20H) OR (C>7FH) THEN
00000660 2    BEGIN (*Character is out of range*)
00000660 2    TEMP[0]:=0;              (*Convert byte into INTEGER for calling ILLEGAL_VALUE*)
00000664 2    TEMP[1]:=INT(STRUC[0]); (*Convert byte into INTEGER for calling ILLEGAL_VALUE*)
0000066C 2    ILLEGAL_VALUE(TEMP,1,TEXT);
00000686 2    IF C < 20H THEN TEXT.LEN:=TEXT.LEN-1; (*Strip off the "?" if C is a control character*)
0000069C 2    END   (*Character is out of range*)
000006A0 2    ELSE
000006A0 2    BEGIN (*Character is in range*)
000006A0 2    PUTCHAR(PTR(ADDR(TEXT.ASCII)),TEXT.LEN,'"');
000006BC 2    PUTCHAR(PTR(ADDR(TEXT.ASCII)),TEXT.LEN+1,CHAR(STRUC[0]));
000006DE 2    PUTCHAR(PTR(ADDR(TEXT.ASCII)),TEXT.LEN+2,'"');
000006FE 2    TEXT.LEN:=TEXT.LEN+3;
00000708 2    END;  (*Character is in range*)
00000708 2  END;
00000000 1  #IF M68000
00000000 1  $PAGE$
00000000 1  (*****************************************************************************)
00000000 1  (**********  STRINGG *********************************************************)
00000000 1  (*****************************************************************************)
00000000 1  (* Format a character string. FOR SODA ONLY, USED TO CONVERT DASE TO ASCII       *)
00000000 1  (* Characters with values 00H-19H are control characters and are displayed as XXH.  *)
00000000 1  (* Characters with values 80H-FFH ara not ascii and are displayed as XXH?.          *)
00000000 1  (* The BPC and 68000 are totaly incompatable in the way they handle bytes, signed vrs *)
00000000 1  (* unsigned types and type conversions.  STRUC[H] is converted to a 16 bit type and  *)
00000000 1  (* shifted around in order to get it into a common form for both processors,        *)
00000000 1  (* just in case it might be used by SPIDER in the future.                         *)
00000000 1  (* Character strings will appear in quotes.                                      *)
```

```
00000000 1 (***********************************************************************************)
00000000 1 (* INPUTS                                                                          *)
00000000 1 (* STRUC        A 32 byte array containing the characters.                         *)
00000000 1 (* STRUC_SIZE   Size of structure used.                                            *)
00000000 1 (* OUTPUTS                                                                         *)
00000000 1 (* TEXT         Character array of the formatted data.                             *)
00000000 1 (***********************************************************************************)
00000000 1 PROCEDURE STRINGG(VAR STRUC:STRUC_TYPE; STRUC_SIZE:INT; VAR TEXT:STRNG);
00000000 2 VAR
00000000 2 TEMP:INTEGER;
00000004 2 C   :INT;
00000006 2 N   :INT;          (*Used as counter and reference into the array*)
00000710 2 BEGIN
00000710 2 N:=0;
00000714 2 WHILE N <= STRUC_SIZE-1 DO BEGIN (* Convert each character *)
00000724 2  C:=STRUC[N];              (*Make the character look the same to BPC and 68000*)
00000732 2  C:=SHIFT(SHIFT(C,8),-8); (*Make the character look the same to BPC and 68000*)
0000073A 2  IF (C < 20H) OR (C>7FH) THEN
00000754 2    BEGIN (*Character is out of range*)
00000754 2    TEMP[0]:=0;             (*Convert byte into INTEGER for calling ILLEGAL_VALUE*)
00000758 2    TEMP[1]:=INT(STRUC[N]); (*Convert byte into INTEGER for calling ILLEGAL_VALUE*)
00000766 2    ILLEGAL_VALUE(TEMP,1,TEXT);
00000780 2    IF C < 20H THEN TEXT.LEN:=TEXT.LEN-1; (*Strip off the "?" if C is a control character*)
00000796 2    N:= N + 1;
0000079A 2    END  (*Character is out of range*)
0000079E 2    ELSE
0000079E 2    BEGIN (*Character is in range*)
0000079E 2    PUTCHAR(PTR(ADDR(TEXT.ASCII)),TEXT.LEN,'"');
000007BA 2    TEXT.LEN:=TEXT.LEN+1;
000007C4 2    WHILE (N<= STRUC_SIZE-1) AND (C>= 20H) AND (C<=7FH) DO
000007F6 2     BEGIN (* Process all characters within range *)
000007F6 2      PUTCHAR(PTR(ADDR(TEXT.ASCII)),TEXT.LEN,CHAR(STRUC[N]));
00000816 2      TEXT.LEN:=TEXT.LEN+1;
00000820 2      N:= N + 1;
00000824 2      IF N<= STRUC_SIZE-1 THEN BEGIN
00000834 2       C:=STRUC[N];              (*Make the character look the same to BPC and 68000*)
00000842 2       C:=SHIFT(SHIFT(C,8),-8); (*Make the character look the same to BPC and 68000*)
0000084A 2      END;  (* IF THEN *)
0000084A 2     END;  (* WHILE character is in range *)
0000084E 2    PUTCHAR(PTR(ADDR(TEXT.ASCII)),TEXT.LEN,'"');
0000086A 2    TEXT.LEN:= TEXT.LEN + 1;
00000874 2    END;  (*Character is in range*)
00000874 2  END;    (* DO BEGIN *)
00000878 2 END;
00000000 1 #ENDIF
00000000 1 $PAGE$
00000000 1 $GLOBPROC OFF$
00000000 1 (***********************************************************************************)
00000000 1 (**********  PTRR *******************************************************************)
00000000 1 (***********************************************************************************)
00000000 1 (* FORMAT PTRR                                                                     *)
00000000 1 (***********************************************************************************)
00000000 1 (* FORMAT SCALAR                                                                   *)
00000000 1 (* INPUTS                                                                          *)
00000000 1 (* STRUC        A 32 byte array containting the raw value of the variable.         *)
00000000 1 (*              variables smaller than 32 bytes are left justified.                *)
00000000 1 (* P            Pointer to data base PTR_NODE.                                     *)
00000000 1 (***********************************************************************************)
00000000 1 (* OUTPUTS                                                                         *)
00000000 1 (* TEXT         Character array of the formatted data.                             *)
00000000 1 (***********************************************************************************)
00000000 1 PROCEDURE PTRRR(VAR STRUC:STRUC_TYPE; VAR TEXT:STRNG; P:PTR);
00000000 2 TYPE
00000000 2 PTR_NODE=RECORD
00000000 3   WORD1          :INT; (*NODE_TYPE IN LSB*)
00000000 3   STRUC_SIZE     :INT;
00000000 3   OFFSET_TO_TYPE :INT;
00000000 2   END;
00000000 2 PTR_NODE_PTR=^PTR_NODE;
00000000 2 VAR
00000000 2 Q          :PTR_NODE_PTR;  (*PTR TO CURRENT SUBRANGE NODE*)
00000004 2 CHARCOUNT :INT;             (*NO OF CHARACTERS TO BE FORMATTED BY FORMATTER*)
00000006 2 I          :INT;
00000830 2
00000830 2 BEGIN
```

```
00000880  2  Q:=PTR_MODE_PTR(P);
00000886  2  IF Q^.STRUC_SIZE=2
00000896  2    THEN CHARCOUNT:=6
000008A0  2    ELSE CHARCOUNT:=10;
000008A6  2  #IF NOT M68000
000008A6  2  FOR I:=0 TO 3 DO PUTCHAR(PTR(ADDR(STRUC)),I,CHAR(STRUC[I])); (*PACK: STRUC_SIZE<= 4 BYTES*)
000008A6  2  #ENDIF
000008A6  2  FORMAT(UNSIGNED,PTR(ADDR(STRUC)),Q^.STRUC_SIZE,PTR(ADDR(TEXT.ASCII)),0,CHARCOUNT,16,LEFT);
000008DA  2  TEXT.LEN:=TEXT.LEN+CHARCOUNT; (* NUMBER OF LEFT JUSTIFIED CHARACTERS RETURNED IN CHARCOUNT*)
000008E4  2  END;
00000000  1  $PAGE$
00000000  1  $GLOBPROC OFF$
00000000  1  (****************************************************************************************)
00000000  1  (**********  PAD  ***********************************************************************)
00000000  1  (****************************************************************************************)
00000000  1  (* FORMAT PAD BYTE (STRUC SIZE IS 1)                                                   *)
00000000  1  (****************************************************************************************)
00000000  1  (* INPUTS                                                                              *)
00000000  1  (* STRUC        A 32 byte array containting the raw value of the variable.             *)
00000000  1  (*              Variables smaller then 32 bytes are left justified in STRUC.           *)
00000000  1  (****************************************************************************************)
00000000  1  (* OUTPUTS                                                                             *)
00000000  1  (* TEXT         Character array of the formatted data.                                 *)
00000000  1  (****************************************************************************************)
00000000  1  PROCEDURE PADBYTE(VAR STRUC:STRUC_TYPE; VAR TEXT:STRNG);
00000000  2  VAR
00000000  2  DESTSIZE:INT;
000008EC  2
000008EC  2  BEGIN
000008EC  2  DESTSIZE:=3;
000008F2  2  #IF NOT M68000
000008F2  2  STRUC[0]:=SHIFT(STRUC[0],8); (*IF BPC THEN PACK MS BYTE OF STRUC*)
000008F2  2  #ENDIF
000008F2  2  FORMAT(UNSIGNED,PTR(ADDR(STRUC)),1,PTR(ADDR(TEXT.ASCII)),TEXT.LEN,DESTSIZE,16,RIGHT);
00000928  2  TEXT.LEN:=DESTSIZE;
00000930  2  END;
00000000  1  $PAGE$
00000000  1  $GLOBPROC OFF$
00000000  1  (****************************************************************************************)
00000000  1  (**********  PART  **********************************************************************)
00000000  1  (****************************************************************************************)
00000000  1  (* STRUC is only partially complete,  format "?" for unknown hex digits.               *)
00000000  1  (* To conserve space on Spider this makes multiple calls to FORMAT as required          *)
00000000  1  (****************************************************************************************)
00000000  1  (* INPUTS                                                                              *)
00000000  1  (* STRUC        A 32 byte array containing the raw value of the variable.              *)
00000000  1  (*              Variables smaller then 32 bytes are left justified in STRUC.           *)
00000000  1  (* USED         A 32 byte array defining the populated or used bytes in STRUC.         *)
00000000  1  (* STRUC_SIZE   Number of bytes in STRUCTURE.                                          *)
00000000  1  (****************************************************************************************)
00000000  1  (* OUTPUTS                                                                             *)
00000000  1  (* TEXT         Character array of the formatted data.                                 *)
00000000  1  (****************************************************************************************)
00000000  1  PROCEDURE PART  (VAR STRUC:STRUC_TYPE; VAR USED:STRUC_TYPE;VAR TEXT:STRNG; STRUC_SIZE:INT);
00000000  2  VAR
00000000  2  DESTSIZE :INT;
00000002  2  I,J      :INT;
00000006  2  #IF NOT M68000
00000006  2  K        :INT;   (* USED FOR PACKING LOCAL BEFORE FORMAT CALLED IN SPIDER *)
00000006  2  #ENDIF
00000006  2  LOCAL    :ARRAY [0..1] OF BYTE;  (* LOCAL COPY NEEDED TO AVOID ODD ADDRESSES *)
00000938  2
00000938  2  BEGIN
00000938  2  I := 0;   (* I ACTS AS AN INDEX TO BOTH THE STRUC AND USED *)
0000093C  2  WHILE I <= STRUC_SIZE-1 DO
0000094C  2   BEGIN
0000094C  2    J := 0;   (* J HOLDS THE # OF BYTES TO BE FORMATTED *)
00000950  2    IF USED[I] = 0 THEN
0000095C  2     BEGIN  (* PLACE '??' IN TEXT STRING *)
0000095C  2      PUTCHAR(PTR(ADDR(TEXT.ASCII)),TEXT.LEN,"?");
00000978  2      PUTCHAR(PTR(ADDR(TEXT.ASCII)),TEXT.LEN + 1,"?");
00000998  2      TEXT.LEN := TEXT.LEN + 2;
000009A2  2      I := I + 1;
000009A6  2     END
000009AA  2     ELSE BEGIN  (* FIND AND FORMAT UP TO 2 BYTES OF USED DATA *)
000009AA  2      WHILE (USED[I] <> 0) AND (J < 2) AND (I <= STRUC_SIZE - 1) DO
```

```
000009E4 2        BEGIN
000009E4 2         LOCAL[J] := STRUC[I];
000009F2 2         J := J + 1;
000009F6 2         I := I + 1;
000009FA 2        END;
000009FC 2       DESTSIZE := J*2 + 1;
00000A0A 2  #IF NOT M68000
00000A0A 2      FOR K:=0 TO 1 DO PUTCHAR(PTR(ADDR(LOCAL)),K,CHAR(LOCAL[K])); (*PACK: STRUC_SIZE<=32 BYTES*)
00000A0A 2  #ENDIF
00000A0A 2      FORMAT(UNSIGNED,PTR(ADDR(LOCAL)),J,PTR(ADDR(TEXT.ASCII)),TEXT.LEN,DESTSIZE,16,LEFT);
00000A3E 2      TEXT.LEN := TEXT.LEN + DESTSIZE - 1;  (* PULL OFF THE 'H'*)
00000A50 2     END;   (* ELSE *)
00000A50 2    END;   (* WHILE LOOP *)
00000A54 2  PUTCHAR(PTR(ADDR(TEXT.ASCII)),TEXT.LEN,"H");
00000A70 2  TEXT.LEN := TEXT.LEN + 1;
00000A7A 2  END;
00000000 1  $PAGE$
00000000 1  $GLOBPROC OFF$
00000000 1  (*************************************************************************************)
00000000 1  (**********  BITT  *******************************************************************)
00000000 1  (*************************************************************************************)
00000000 1  (* FORMAT BIT FIELD                                                                  *)
00000000 1  (*************************************************************************************)
00000000 1  (* INPUTS                                                                            *)
00000000 1  (* VALUE        4 byte representation of the data to be formatted.                 *)
00000000 1  (* P            Pointer to data base BIT_MODE.                                      *)
00000000 1  (*************************************************************************************)
00000000 1  (* OUTPUTS                                                                           *)
00000000 1  (* TEXT         Character array of the formatted data.                              *)
00000000 1  (*************************************************************************************)
00000000 1  PROCEDURE BITT(VALUE:INTEGER; VAR TEXT:STRNG; P:PTR);
00000000 2  CONST
00000000 2  BASE      =2; (*Format bit fields in base 2*)
00000000 2  SOURCESIZE=2; (*2 bytes of source data*)
00000000 2  TYPE
00000000 2  BIT_MODE=RECORD
00000000 3    WORD1             :INT; (*MODE_TYPE IN LSB*)
00000000 3    SIZE              :INT; (*No of bytes (always 2 for bit fields). *)
00000000 3    NO_OF_BITS        :INT; (*No of bits in field (also used as flag, negative==> no bit field selected) *)
00000000 3    STARTING_BIT      :INT;
00000000 2    END;
00000000 2  BIT_MODE_PTR=^BIT_MODE;
00000000 2
00000000 2  VAR
00000000 2  Q            :BIT_MODE_PTR;
00000004 2  CHARCOUNT    :INT;
00000006 2  I            :INT; (*Index for writing don't cares to TEXT*)
00000008 2  STARTING     :INT; (*Index into TEXT of first char not dontcared*)
0000000A 2  ENDING       :INT; (*Index into TEXT of last  char not dontcared*)
00000A82 2
00000A82 2  BEGIN WITH TEXT DO BEGIN
00000A8A 2  Q:=BIT_MODE_PTR(P);
00000A90 2  CHARCOUNT:=17;
00000A96 2  FORMAT(UNSIGNED,PTR(ADDR(VALUE[1])),SOURCESIZE,PTR(ADDR(ASCII)),LEN,CHARCOUNT,BASE,RIGHT);
00000AC8 2  IF Q^.NO_OF_BITS<0 THEN
00000AD4 2    BEGIN (*It was ok to display all bits, set the flag back to positive*)
00000AD4 2    Q^.NO_OF_BITS:=-Q^.NO_OF_BITS;
00000ADE 2    END   (*It was ok to display all bits, set the flag back to positive*)
00000AE2 2    ELSE
00000AE2 2    BEGIN (*Don't care extranous bits*)
00000AE2 2    STARTING:=16-(Q^.STARTING_BIT+Q^.NO_OF_BITS);(*Index to first char not dontcared*)
00000AFA 2    ENDING  :=15-Q^.STARTING_BIT;                    (*Index to last  char not dontcared*)
00000B08 2    FOR I:=0 TO STARTING-1  DO PUTCHAR(PTR(ADDR(ASCII)),I,"X");
00000B46 2    FOR I:=ENDING+1 TO 15   DO PUTCHAR(PTR(ADDR(ASCII)),I,"X");
00000B84 2    END;  (*Don't care extranous bits*)
00000B84 2  LEN:=LEN+17;
00000B8C 2  END; END;
00000000 1  $PAGE$
00000000 1  #IF M68000
00000000 1  $GLOBPROC OFF$
00000000 1  (*************************************************************************************)
00000000 1  (*************  CHANGE_BASE  *********************************************************)
00000000 1  (*************************************************************************************)
00000000 1  (* Accepts up to an 32 byte structure and converts it to the requested base         *)
00000000 1  (*************************************************************************************)
```

```
00000000 1 (* INPUTS                                                                              *)
00000000 1 (*   STRUC      A 32 byte array containing the raw value of the variable.                  *)
00000000 1 (*   STRUC_SIZE # of left justified bytes in STRUC                                         *)
00000000 1 (*   BASE       Base to change into                                                        *)
00000000 1 (* OUTPUT                                                                                  *)
00000000 1 (*   TEXT       Character array of the formatted data                                      *)
00000000 1 (*****************************************************************************************)
00000000 1 PROCEDURE CHANGE_BASE (VAR STRUC:STRUC_TYPE;STRUC_SIZE:INT;BASE:INT;VAR TEXT:STRNG);
00000000 2
00000000 2 VAR
00000000 2   BASE_NUM :  INT;
00000002 2   DESTSIZE :  INT;
00000B94 2
00000B94 2 BEGIN
00000B94 2   CASE BASE OF
00000B9E 2     BIN     :BEGIN
00000B9E 2               DESTSIZE:=STRUC_SIZE*8 +1;
00000BAC 2               BASE_NUM:= 2;
00000BB2 2               END;
00000BB6 2     OCT     :BEGIN
00000BB6 2               DESTSIZE:=STRUC_SIZE*3 +1;
00000BC4 2               BASE_NUM:= 8;
00000BCA 2               END;
00000BCE 2     DEC     :BEGIN
00000BCE 2               DESTSIZE:=STRUC_SIZE*3 +1;
00000BDC 2               BASE_NUM:= 10;
00000BE2 2               END;
00000BE6 2     HEX     :BEGIN
00000BE6 2               DESTSIZE:= STRUC_SIZE*2 +1;
00000BF4 2               BASE_NUM:= 16;
00000BFA 2               END;
00000BFE 2   OTHERWISE;
00000BFE 2   END;   (* CASE *)
00000C26 2   IF BASE <> ASCII THEN  (* FORMAT NEW BASE *)
00000C2E 2     BEGIN
00000C2E 2      IF STRUC_SIZE <= 4 THEN
00000C3A 2       FORMAT (UNSIGNED,PTR(ADDR(STRUC)),STRUC_SIZE,PTR(ADDR(TEXT.ASCII)),TEXT.LEN,DESTSIZE,BASE_NUM,LEFT)
00000C70 2       ELSE  (* STRUC TOO LARGE, MUST USE LONG_FMT *)
00000C70 2       LONG_FMT(STRUC,STRUC_SIZE,PTR(ADDR(TEXT.ASCII)),TEXT.LEN,DESTSIZE,BASE_NUM);
00000C9E 2      TEXT.LEN:= TEXT.LEN + DESTSIZE;
00000CA8 2     END
00000CAC 2     ELSE                (* FORMAT ASCII *)
00000CAC 2     STRINGG (STRUC,STRUC_SIZE,TEXT);
00000CC8 2 END;    (* CHANGE_BASE *)
00000000 1 $PAGE$
00000000 1 #ENDIF
00000000 1 $GLOBPROC ON$
00000000 1 (*****************************************************************************************)
00000000 1 (**********  FIX_INTEL_DATA **************************************************************)
00000000 1 (*****************************************************************************************)
00000000 1 (* INPUTS                                                                                  *)
00000000 1 (* STRUC         A 32 byte array containing the raw value of the variable.                 *)
00000000 1 (*               Variables smaller than 32 bytes are left justified.                        *)
00000000 1 (*               If SODA (68000) then this array is packed.                                *)
00000000 1 (*               If SPIDER (BPC) then this array is sparce.                                *)
00000000 1 (* USED          A 32 byte array defining the populated or used bytes in STRUC.            *)
00000000 1 (*               If SODA (68000) then this array is packed.                                *)
00000000 1 (*               If SPIDER (BPC) then this array is sparce.                                *)
00000000 1 (* STRUC_SIZE   # OF left justified bytes in STRUC                                         *)
00000000 1 (*****************************************************************************************)
00000000 1 (* OUTPUTS                                                                                 *)
00000000 1 (* STRUC         Same as input only transposed if INTEL processor.                         *)
00000000 1 (*****************************************************************************************)
00000000 1 PROCEDURE FIX_INTEL_DATA(VAR STRUC,USED:STRUC_TYPE; STRUC_SIZE:INT);
00000000 2 CONST
00000000 2 E_8086 = 00F0H; (*Emulator id code for qued version of 8086*)
00000000 2 VAR
00000000 2 I     :INT;
00000002 2 TEMP  :BYTE;
00000CD0 2 BEGIN
00000CD0 2 FOR I:=0 TO (STRUC_SIZE-1) DIV 2 DO
00000CEC 2   BEGIN
00000CEC 2   TEMP:=STRUC[I];
00000CFA 2   STRUC[I]:=STRUC[STRUC_SIZE-1-I];
```

```
00000D0E  2    STRUC[STRUC_SIZE-1-I]:=TEMP;
00000D22  2    TEMP:=USED[I];
00000D30  2    USED[I]:=USED[STRUC_SIZE-1-I];
00000D44  2    USED[STRUC_SIZE-1-I]:=TEMP;
00000D58  2    END;
00000D6A  2  END;
00000000  1  $PAGE$
00000000  1  $GLOBPROC ON$
00000000  1  (*************************************************************************************)
00000000  1  (**********  FMTVAL MAIN PROGRAM *****************************************************)
00000000  1  (*************************************************************************************)
00000000  1  (* FORMAT THE VALUE OF A VARIABLE.                                                   *)
00000000  1  (*************************************************************************************)
00000000  1  (* INPUTS                                                                            *)
00000000  1  (* STRUC        A 32 byte array containing the raw value of the variable.           *)
00000000  1  (*              Variables smaller then 32 bytes are left justified in STRUC.        *)
00000000  1  (*              STRUC is unpacked in BPC.                                           *)
00000000  1  (* USED         A 32 byte array defining the populated or used bytes in STRUC.      *)
00000000  1  (* COUNT        # of bytes used in STRUC                                            *)
00000000  1  (* PAD_FLAG     TRUEE if STRUC is a pad byte.                                       *)
00000000  1  (* P            Points to terminal structure's data base node  i.e. a               *)
00000000  1  (*              SCALAR_, SUBRANGE_, PTR_, SET_, REAL_, OR CHARACTER_.               *)
00000000  1  (*************************************************************************************)
00000000  1  (* OUTPUTS                                                                           *)
00000000  1  (* TEXT         Character array of the formatted data.                              *)
00000000  1  (*************************************************************************************)
00000000  1  PROCEDURE FMTVAL  (VAR TEXT:STRNG; VAR P:PTR; VAR STRUC,USED:STRUC_TYPE; COUNT:INT; PAD:BOOLEAN);
00000000  2
00000000  2  TYPE
00000000  2  GENERIC_NODE=RECORD
00000000  3    WORD1          :INT;       (*NODE TYPE IN LSB*)
00000000  3    STRUC_SIZE     :INT;
00000000  2    END;
00000000  2  GENERIC_NODE_PTR  =^GENERIC_NODE;
00000000  2
00000000  2  VAR
00000000  2  VALUE        :INTEGER;          (*VALUE OF VARIABLE TAKEN FROM STRUC*)
00000004  2  STRUC_TYPE   :INT;              (*TYPE OF STRUCTURE TO BE DISPLAYED*)
00000006  2  Q            :GENERIC_NODE_PTR; (*PTR INTO DATA BASE*)
0000000A  2  STRUC_SIZE   :INT;              (*STRUC_SIZE WORD OF DATA BASE NODE*)
0000000C  2  #IF M68000
0000000C  2  BASE         :INT;          (*BASE TO USE FOR VALUES*)
00000D72  2  #ENDIF
00000D72  2  BEGIN
00000D72  2  Q:=GENERIC_NODE_PTR(P);
00000D7A  2  TEXT.LEN:=0;
00000D80  2  STRUC_SIZE:=Q^.STRUC_SIZE;
00000D8A  2  STRUC_TYPE:=SHIFT(SHIFT(P^,8),-8);  (*GET LS BYTE*)
00000D9A  2  IF (ENVIRONMENT^.INTEL) AND (STRUC_TYPE<>SET_) (*IF INTEL PROCESSOR TRANSPOSE BYTES IN STURC*)
00000DB2  2    THEN FIX_INTEL_DATA(STRUC,USED,STRUC_SIZE);
00000DCE  2  IF COUNT<>STRUC_SIZE THEN STRUC_TYPE:=PARTIAL_;
00000DE0  2  IF PAD THEN STRUC_TYPE:=PAD_;
00000DEE  2  #IF M68000
00000DEE  2  CURRENT_BASE(BASE);
00000DFA  2  (* IF A CHANGE BASE IS REQUESTED IGNORE IT IF THIS IS A PAD BYTE OR A PARTIAL VALUE *)
00000DFA  2  (* IF DECIMAL HAS BEEN REQUESTED THEN MUST BE SURE TO GET INFO ABOUT SIGN IF A SUBRANGE OR FUNDAMENTAL*)
00000DFA  2  (* IF STRUC_SIZE>8 ONLY ALLOW BASE TO CHANGE IF TO HEX, THIS CAN ONLY BE A PASCAL SET *)
00000DFA  2  IF ((BASE=DEFAULT) OR (STRUC_TYPE=PAD_)
00000DFA  2                       OR (STRUC_TYPE=PARTIAL_)
00000DFA  2                       OR ((BASE=DEC) AND ((STRUC_TYPE=SUBRANGE_) OR (STRUC_TYPE=FUNDAMENTAL_)))
00000DFA  2                       OR ((STRUC_SIZE>8) AND (BASE<>HEX))) THEN BEGIN  (* USE DEFAULT BASE *)
00000E68  2  #ENDIF
00000E68  2    CASE STRUC_TYPE OF
00000E70  2                     (*THE PROCEDURES FOR SCALARS AND SUBRANGES ARE GENERALIZED BY PACKING*)
00000E70  2                     (*STRUC INTO VALUE. THIS ALLOWS THEM TO BE USED TO FORMAT ARRAY INDEXES IN FMTSYM*)
00000E70  2      SUBRANGE_        :BEGIN
00000E70  2                      STRUC_TO_INTEGER(STRUC,VALUE,P);
00000E8C  2  #IF M68000
00000E8C  2                       (* WANT TO FORMAT IN NEW BASE IF SUBRANGE IS A SCALAR *)
00000E8C  2                      IF BASE=DEC THEN
00000E98  2                       IF SCALAR_TEST(VALUE,P) THEN
00000EB0  2                         CHANGE_BASE(STRUC,STRUC_SIZE,BASE,TEXT)
00000ED4  2                         ELSE SUBRANGE (VALUE,TEXT,P)
00000EF4  2                      ELSE
00000EF4  2  #ENDIF
```

```
00000EF4  2                 SUBRANGE (VALUE,TEXT,P);
00000F10  2                 END;
00000F14  2    SCALAR_       :BEGIN
00000F14  2                 STRUC_TO_INTEGER(STRUC,VALUE,P);
00000F30  2                 SCALAR  (VALUE,TEXT,P);
00000F4C  2                 END;
00000F50  2    FUNDAMENTAL_  :BEGIN  (*C only!  In PASCAL we always get to FUNDAMENTAL via a SUBRANGE*)
00000F50  2                 STRUC_TO_INTEGER(STRUC,VALUE,P);
00000F6C  2                 FUNDAMENTAL(VALUE,TEXT,P,0);(*0 is a dummy, since SIGN_FLAG is not used in C. *)
00000F8A  2                 END;
00000F8E  2    BIT_          :BEGIN  (*Bit fields in C only*)
00000F8E  2                 STRUC_TO_INTEGER(STRUC,VALUE,P);
00000FAA  2                 BITT       (VALUE,TEXT,P);
00000FC6  2                 END;  (*Bit fields in C only*)
00000FCA  2   PAD_          :PADBYTE   (STRUC,TEXT);               (*FORMAT PAD BYTE*)
00000FE2  2   PARTIAL_      :PART      (STRUC,USED,TEXT,STRUC_SIZE);(*FORMAT "partial" BEFORE THE DATA*)
00001008  2   POINTER_      :PTRRR     (STRUC,TEXT,P);
0000102A  2   SET_          :SETT      (STRUC,TEXT,P);
0000104C  2   REAL_         :FORMATREAL(STRUC,TEXT,Q^.STRUC_SIZE);
00001070  2   CHARACTER_    :CHARR     (STRUC,TEXT);
00001088  2   OTHERWISE;
00001088  2   END;    (* CASE *)
000010C8  2  #IF M68000
000010C8  2    END   (* IF THEN *)
000010CC  2  ELSE          (* BASE OTHER THAN DEFAULT IS TO BE USED *)
000010CC  2    CHANGE_BASE(STRUC,STRUC_SIZE,BASE,TEXT);
000010EC  2  #ENDIF
000010EC  2  END;.
```

****WARNING ?? - Symbol: LABEL_1, is duplicated in the asnb_syn file.

End of compilation, number of errors=    0

```
                     "68000"
                     ***************************************************************
                     ***********  FMTKC9A  ******************************************
                     ***************************************************************
                     * PROCEDURE FMTKC9A (KC9A_TIME_FLAG:BOOLEAN; DEST:PTR; DEST_OFFSET:INT,*
                     *                    BASE_TAG,CURR_TAG:KC9A_TAG);EXTERNAL;
                     ***************************************************************
                     * 1ST 4 BYTES OF STACK= RETURN ADDRESS                          *
                     * 2ND 4 BYTES OF STACK= ADDRESS OF 64 BIT COUNT TAG (BINM,BINL)  *
                     * 3RD 4 BYTES OF STACK= ADDRESS OF 64 BIT BASE COUNT, THIS WILL BE THE *
                     *                       COUNT TAG OF THE TRIGGER PT IF DISPLAY ABSOLUTE*
                     *                       OR PREVIOUS TAG IF DISPALY RELATIVE.      *
                     * 4TH 2 BYTES OF STACK= BYTE OFFSET TO BE ADDED TO DEST ADDRESS   *
                     * 5TH 4 BYTES OF STACK= ADDR OF DEST OF FORMATTED COUNT (WORD BOUNDRY) *
                     * 6TH 1 BYTES OF STACK= KC9A_TIME_FLAG:     1=TIME    0=STATES    *
                     ***************************************************************
                     * ALWAYS OUTPUTS 9 CHARACTERS                                   *
                     ***************************************************************
                      GLB FMTKC9A


          <0000>     BINM        EQU    D0    COUNT TAG OF CURRENT DATA, MS 32BITS
          <0001>     BINL        EQU    D1    COUNT TAG OF CURRENT DATA, LS 32BITS
          <0002>     BASEM       EQU    D2    BASE COUNT MS 32BITS (TO BE SUBTRACTED FROM BINM,BINL TO FORM ABS OR REL COUNT)
          <0003>     BASEL       EQU    D3    BASE COUNT MS 32BITS (TO BE SUBTRACTED FROM BINM,BINL TO FORM ABS OR REL COUNT)
          <0004>     INDEX       EQU    D4    INDEX INTO FORMATTING TABLES BASED ON 1ST NON_ZERO CHAR IN 16 CHAR ASCII BUFFER
          <0005>     COUNT       EQU    D5    GENERAL PURPOSE LOOP COUNTER
          <0000>     SOURCE      EQU    A0    ADDRESS OF SOURCE CHAR IN 16 BYTE ASCII BUFFER
          <0001>     DEST        EQU    A1    DEST ADDRESS OF FORMATTED COUNT
          <0002>     TABLE       EQU    A2    ADDRESS OF ONE OF THE FORMATTING TABLES
          <0006>     DEST_OFFSET EQU    D6    BYTE OFFSET TO BE ADDED TO DEST ADDRESS

000000               SIGN      DS.B   1     ASCII CHARACTER " " OR "-"
000001               ASCII     DS.B   16    16 BYTE ASCII BUFFER
000011 00                      DC.B   00    ASCII BUFFER TERMINATOR BYTE
000012               TIMEFLAG  DS.B   1     01=TIME, 00=TIME
000014 0000 0009     DESTSIZE  DC.L   9     SIZE IN BYTES OF DESTINATION
```

```
LOCATION OBJECT CODE LINE     SOURCE LINE

                    ****************************************************************
                    ********** MAIN PROGRAM ****************************************
                    ****************************************************************
                    * THE CURRENT COUNT TAG TO BE DISPLAYED IS EITHER A STATE OR TIME      *
                    * COUNT.  IT MAY BE DISPLAYED EITHER RELATIVE OR ABSOLUTE.             *
                    * ALL TAGS ARE AN ABSOLUTE COUNT, RELATIVE TO THE START OF THE TRACE.  *
                    * IF THE MODE IS ABSOLUTE THIS MEANS ABSOLUTE, WITH RESPECT TO THE     *
                    * TRIGGER POINT (SUBTRACT OFF TRIGGER TAG).  IF THE MODE IS RELATIVE,  *
                    * THIS MEANS RELATIVE WITH RESPECT TO THE  PREVIOUS TAG (SUBTRACT OFF  *
                    * PREVIOUS TAG).                                                       *
                    * THE TRIGGER TAG OR PREVIOUS TAG IS PASSED ON THE STACK AND IS STORED *
                    * IN REGISTER PAIR BASEL,BASEM.                                        *
                    ****************************************************************
000018 206F 0004    FMTKC9A  MOVE.L  4(A7),A0          GET ADDRESS OF CURRENT COUNT TAG
00001C 2028 0000             MOVE.L  0(A0),BINM        GET CURRENT COUNT TAG MS 32BITS
000020 2228 0004             MOVE.L  4(A0),BINL        GET CURRENT COUNT TAG LS 32 BITS
000024 206F 0008             MOVE.L  8(A7),A0          GET ADDRESS OF BASE COUNT
000028 2428 0000             MOVE.L  0(A0),BASEM       MOVE MS 32BITS TO BASEM
00002C 2628 0004             MOVE.L  4(A0),BASEL       MOVE LS 32BITS TO BASEL
000030 3C2F 000C             MOVE.W  12(A7),DEST_OFFSET  GET BYTE OFFSET TO BE ADDED TO DEST
000034 226F 000E             MOVE.L  14(A7),DEST       GET DEST ADDR OF FORMTTED COUNT FROM STACK
000038 13EF 0012             MOVE.B  18(A7),TIMEFLAG   GET STATE/TIME FLAG
000040 13FC 0020             MOVE.B  #" ",SIGN         ASSUME POSITIVE RESULT FOR FOLLOWING SUBTRACTION
000048 48C6                  EXT.L   DEST_OFFSET
00004A D3C6                  ADD.L   DEST_OFFSET,DEST
00004C 0800 001F             BTST    #31,BINM          CHECK BIT 31 OF MSB OF BINM (REGISTER D0) FOR NEG.VALUE (OVERFLOW)
000050 6700 0028             BEQ     NOVRFLW           CONTINUE IF NO OVERFLOW
000054 12FC 0020             MOVE.B  #" ",(DEST)+      ELSE OUTPUT '   OVRFLW'
000058 12FC 006F             MOVE.B  #"o",(DEST)+
00005C 12FC 0076             MOVE.B  #"v",(DEST)+
000060 12FC 0065             MOVE.B  #"e",(DEST)+
000064 12FC 0072             MOVE.B  #"r",(DEST)+
000068 12FC 0066             MOVE.B  #"f",(DEST)+
00006C 12FC 006C             MOVE.B  #"l",(DEST)+
000070 12FC 006F             MOVE.B  #"o",(DEST)+
000074 12FC 0077             MOVE.B  #"w",(DEST)+
000078 4E75                  RTS                       END OF PROCEDURE
00007A 9283         NOVRFLW  SUB.L   BASEL,BINL        SUBTRACT LS 32BITS OF BASE
00007C 9182                  SUBX.L  BASEM,BINM        SUBTRACT MS 32BITS OF BASE

                             ********** TAKE ABSOLUTE VALUE OF BIN AND SAVE SIGN
                             ********** THIS WILL NO LONGER BE REACHED IF NEGATIVE VALUE
00007E 6A00 000E             BPL     TOASCII           IF POSITIVE RESULT CONVERT IT TO ASCII
000082 13FC 002D             MOVE.B  #"-",SIGN         NEGATIVE RESULT ==> SIGN IS NEGATIVE
00008A 4481                  NEG.L   BINL              COMPLIMENT RESULT LS 32BITS
00008C 4080                  NEGX.L  BINM              COMPLIMENT RESULT MS 32BITS

                             ********** CONVERT 64BIT BINARY TO ASCII
00008E 2F00         TOASCII  MOVE.L  BINM,-(A7)        PUSH CURRENT TAG ON STACK
000090 2F01                  MOVE.L  BINL,-(A7)        PUSH CURRENT TAG ON STACK
000092 4879                  PEA     ASCII             PUSH ASCII DESTINATION ADDR ON STACK
000098 4EB9                  JSR     BIN_ASCII
00009E DFFC                  ADD.L   #12,A7            CLEAR THE STACK

                             ********** FIND INDEX TO 1ST NON ZERO DIGIT IN ASCII THEN CHOOSE STATE OR TIME
0000A4 41F9                  LEA     ASCII,SOURCE      SOURCE NOW PTS TO 1ST BYTE IN ASCII CHAR BUFFER
0000AA 3A3C 000F             MOVE.W  #15,COUNT         LOOK AT A MAXIMUM OF 16 CHARACTERS
0000AE 0C18 0030    ZEROLOOP CMP.B   #"0",(SOURCE)+
0000B2 56CD FFFA             DBNE    COUNT,ZEROLOOP
0000B6 5388                  SUBQ.L  #1,SOURCE         ADJUST FOR POST INCRIMENT IN LOOP
0000B8 2808                  MOVE.L  SOURCE,INDEX      SOURCE,INDEX NOW PT TO 1ST NON ZERO CHAR OR LAST CHAR
0000BA 45F9                  LEA     ASCII,TABLE       TABLE NOW PTS TO 1ST ASCII CHARACTER
0000C0 988A                  SUB.L   TABLE,INDEX       INDEX NOW CONTAINS INDEX INTO ASCII OF 1ST NON_ZERO CHAR OR LAST CHAR
0000C2 12F9                  MOVE.B  SIGN,(DEST)+      MOVE THE SIGN CHARACTER TO FINAL DESTINATION
0000C8 4A39                  TST.B   TIMEFLAG          CHOOSE STATE OR TIME
0000CE 6600 0118             BNE     TIME
0000D2 6000 0022             BRA     STATE
                    ****************************************************************
                    ********** FORMAT STATE COUNT ***********************************
                    ****************************************************************
                    * COUNTS >= 611670 ARE RIGHT JUSTIFIED, FLOATING POINT      -n.nnnEnn  *
                    * COUNTS <  611670 ARE RIGHT JUSTIFIED, FIXED    POINT       -nnnnnn   *
                    ****************************************************************
```

```
0000D6 3135313431    EXPONETS  ASCII "151413121110090807060504030201OO"


                               ********** CHOOSE FIXED OR FLOATING PT
0000F6 4A80          STATE     TST.L   BINM               IF MS 32BITS > 0
0000F8 6600 002C               BNE     FLOAT              THEN FORMAT IN FLOATING POINT
0000FC 0C81                    CMP.L   #611669,BINL       IF LS 32BITS HIGHER THAN 611669
000102 6200 0022               BHI     FLOAT              THEN FORMAT IN FLOATING POINT



                               ********** FORMAT IN FIXED POINT
000106 2A39          FIXED     MOVE.L  DESTSIZE,COUNT     COMPUTE BLANK COUNT
00010C DA84                    ADD.L   INDEX,COUNT        COMPUTE BLANK COUNT
00010E 0485                    SUB.L   #18,COUNT          COMPUTE BLANK COUNT
000114 12FC 0020     BLANKLOOP MOVE.B  #" ",[DEST]+
000118 51CD FFFA               DBRA    COUNT,BLANKLOOP
00011C 12D8          FIXEDLOOP MOVE.B  [SOURCE]+,[DEST]+
00011E 0C10 0000               CMP.B   #0,[SOURCE]        TEST FOR ASCII TERMINATOR CHARACTOR
000122 66F8                    BNE     FIXEDLOOP
000124 4E75                    RTS



                               ********** FORMAT IN FLOATING POINT
000126 12D8          FLOAT     MOVE.B  [SOURCE]+,[DEST]+
000128 12FC 002E               MOVE.B  #".",[DEST]+
00012C 12D8                    MOVE.B  [SOURCE]+,[DEST]+
00012E 12D8                    MOVE.B  [SOURCE]+,[DEST]+
000130 12D8                    MOVE.B  [SOURCE]+,[DEST]+
000132 12FC 0045               MOVE.B  #"E",[DEST]+
000136 E38C                    LSL.L   #1,INDEX             COMPUTE INDEX INTO EXPONETS TABLE
000138 45F9                    LEA     EXPONETS,TABLE       ADDRESS OF BINARY TO ASCII EXPONET CONVERSION TABLE
00013E 12F2 4000               MOVE.B  0[TABLE,INDEX],[DEST]+ MOVE THE 1ST EXPONET CHAR
000142 12F2 4001               MOVE.B  1[TABLE,INDEX],[DEST]+ MOVE THE 2ND EXPONET CHAR
000146 4E75                    RTS
                     ***************************************************************************
                     ********** FORMAT TIME COUNT ***********************************************
                     ***************************************************************************
                     * TIME FMT IS BASED ON THE LOCATION (INDEX) OF THE 1ST NON_ZERO CHAR        *
                     * (OR LAST CHAR IF ALL CHARACTERS ARE ZERO) IN CHARACTER ARRAY ASCII.       *
                     * -  0.X uS                                                                 *
                     * -  X.X uS     -X.XXX mS     -X.XXX  S     -X.XXX KS     -X.XXX MS         *
                     * - XX.X uS     -XX.XX mS     -XX.XX  S     -XX.XX KS     -XX.XX MS         *
                     * -XXX.X uS     -XXX.X mS     -XXX.X  S     -XXX.X KS     -XXX.X MS         *
                     ***************************************************************************
000148 0000 0001     START     DC.W  0, 1, 2, 3, 4, 5, 6, 7, 8, 9,10,11,12,13,14,14
000168 0000 0000     BLANKS    DC.W  0, 0, 0, 0, 0, 0, 0, 0, 0, 0, 0, 0, 0, 1, 2, 2
000188 0003 0002     BEFORE    DC.W  3, 2, 1, 3, 2, 1, 3, 2, 1, 3, 2, 1, 3, 2, 1, 1
0001A8 0001 0002     AFTER     DC.W  1, 2, 3, 1, 2, 3, 1, 2, 3, 1, 2, 3, 1, 1, 1, 1
0001C8 4D534D534D    EXPONET   ASCII "MSMSMSKSKSKS S S SmSmSmSuSuSuSuS"

                               ********** INIT SOURCE REGISTER FROM START TABLE
0001E8 E34C          TIME      LSL     #1,INDEX       CHANGE FROM BYTE INDEX TO WORD INDEX
0001EA 41F9                    LEA     ASCII,SOURCE
0001F0 45F9                    LEA     START,TABLE
0001F6 D0F2 4000               ADD.W   0[TABLE,INDEX],SOURCE

                               ********** PUSH n NUMBER OF BLANKS
0001FA 45F9                    LEA     BLANKS,TABLE
000200 3A32 4000               MOVE.W  0[TABLE,INDEX],COUNT
000204 6000 0006               BRA     LOOP2_TST
000208 12FC 0020     LOOP2     MOVE.B  #" ",[DEST]+
00020C 51CD FFFA     LOOP2_TST DBRA    COUNT,LOOP2

                               ********** PUSH n CHARACTERS BEFORE DECIMAL PT
000210 45F9                    LEA     BEFORE,TABLE
000216 3A32 4000               MOVE.W  0[TABLE,INDEX],COUNT
00021A 6000 0004               BRA     LOOP3_TST
00021E 12D8          LOOP3     MOVE.B  [SOURCE]+,[DEST]+
000220 51CD FFFC     LOOP3_TST DBRA    COUNT,LOOP3

                               ********** PUSH DECIMAL PT THEN n CHARACTERS AFTER DECIMAL PT
000224 12FC 002E               MOVE.B  #".",[DEST]+
000228 45F9                    LEA     AFTER,TABLE
```

```
00022E 3A32 4000                 MOVE.W  0(TABLE,INDEX),COUNT
000232 6000 0004                 BRA     LOOP4_TST
000236 12D8         LOOP4        MOVE.B  (SOURCE)+,(DEST)+
000238 51CD FFFC    LOOP4_TST    DBRA    COUNT,LOOP4

                                 ********** PUSH 1 SPACES THEN 2 EXPONET CHARACTERS
00023C 12FC 0020                 MOVE.B  #" ",(DEST)+
000240 45F9                      LEA     EXPONET,TABLE
000246 12F2 4000                 MOVE.B  0(TABLE,INDEX),(DEST)+ MOVE THE 1ST EXPONET CHAR
00024A 12F2 4001                 MOVE.B  1(TABLE,INDEX),(DEST)+ MOVE THE 2ND EXPONET CHAR
00024E 4E75                      RTS
                    ******************************************************************************
                    ***********  BIN_ASCII  ******************************************************
                    ******************************************************************************
                    * CONVERT 64 BIT BINARY TO 16 BYTE ASCII                                     *
                    * 1ST 4 BYTES OF STACK= RETURN ADDRESS                                       *
                    * 2ND 4 BYTES OF STACK= ADDRESS OF 16 BYTE ASCII DATA DESTINATION            *
                    * 3RD 4 BYTES OF STACK= LS 32 BITS OF BINARY DATA                            *
                    * 4TH 4 BYTES OF STACK= MS 32 BITS OF BINARY DATA                            *
                    *                                                                            *
                    * ALGORITHM:  FOR COUNT=63 THRU 0 DO SHIFT MS BIT OF 64 BIT BINARY            *
                    *             INTO EXTEND, ADD EXTEND TO BCD, MULT BCD BY TWO.               *
                    ******************************************************************************
                    * BINM       EQU     D0      COUNT TAG OF CURRENT DATA, MS 32BITS
                    * BINL       EQU     D1      COUNT TAG OF CURRENT DATA, LS 32BITS
                    * COUNT      EQU     D5      GENERAL PURPOSE LOOP COUNTER
                    ******************************************************************************
000250 0000 0000    ZERO         DC.L    0,0
000258              BCD          DS.B    8                    16 DIGIT BCD DATA


000260 4E56 FFEC    BIN_ASCII    LINK    A6,#-20              ALLOCATE STACK AREA FOR 5 REGISTERS, OLD STACK POINTER IN A6
000264 48D7 0323                 MOVEM.L D0/D1/D5/A0/A1,(A7) STASH 5 REGISTERS
000268 41F9                      LEA     BCD,A0               POINT TO BCD DATA
00026E 20B9                      MOVE.L  ZERO,(A0)            CLEAR BCD
000274 2179                      MOVE.L  ZERO,4(A0)           CLEAR BCD
00027C 3A3C 003F                 MOVE.W  #63,COUNT            INITIALIZE BIT COUNT
000280 222E 000C                 MOVE.L  12(A6),BINL          GET LEAST SIG 32 BIN BINARY FROM STACK
000284 202E 0010                 MOVE.L  16(A6),BINM          GET MOST  SIG 32 BIT BINARY FROM STACK
000288 6B00 0014                 BMI     LOOP                 BINARY MS 32 BITS<0  ==> NO LEADING ZEROS TO SHIFT OFF

                                 ********** SHIFT OFF BIANRY LEADING ZEROS
00028C E389         ZEROLOOP2    LSL.L   #1,BINL              SHIFT OFF BINARY LEADING ZEROS
00028E E390                      ROXL.L  #1,BINM              SHIFT OFF BINARY LEADING ZEROS
000290 5BCD FFFA                 DBMI    COUNT,ZEROLOOP2      BINARY MS 32 BITS>0 ==> MORE LEADING ZEROS
000294 0C45 FFFF                 CMP.W   #-1,COUNT            IF COUNT=-1 THEN IM OUT OF BINARY (BCD=0)
000298 6700 0022                 BEQ     BCD_ASCII
00029C 5345                      SUBQ.W  #1,COUNT             COUNT DID NOT DECRIMENT ON LAST DBMI INSTRUCTION

00029E D0FC 0008    LOOP         ADDA    #8,A0                POINT TO 1 BYTE PAST BCD
0002A2 2248                      MOVE.L  A0,A1                POINT TO 1 BYTE PAST BCD
0002A4 E389                      LSL.L   #1,BINL              SHIFT MS BIT OF BINARY INTO EXTEND BIT
0002A6 E390                      ROXL.L  #1,BINM              SHIFT MS BIT OF BINARY INTO EXTEND BIT
0002A8 C308                      ABCD    -(A0),-(A1)          ADD BCD TO ITSELF WITH EXTEND BIT FROM BINARY
0002AA C308                      ABCD    -(A0),-(A1)
0002AC C308                      ABCD    -(A0),-(A1)
0002AE C308                      ABCD    -(A0),-(A1)
0002B0 C308                      ABCD    -(A0),-(A1)
0002B2 C308                      ABCD    -(A0),-(A1)
0002B4 C308                      ABCD    -(A0),-(A1)
0002B6 C308                      ABCD    -(A0),-(A1)
0002B8 51CD FFE4                 DBF     COUNT,LOOP




                                 ********** CONVERT 8 BYTE BCD TO 16 BYTE ASCII
0002BC 41F9         BCD_ASCII    LEA     BCD,A0               GET ADDRESS OF BCD   DATA
0002C2 226E 0008                 MOVE.L  8(A6),A1             GET ADDRESS OF ASCII DESTINATION FROM STACK
0002C6 3A3C 0007                 MOVE.W  #7,COUNT
0002CA 1018         ASCIILOOP    MOVE.B  (A0)+,D0             GET BCD BYTE
0002CC 1200                      MOVE.B  D0,D1                SAVE A COPY IN D1
0002CE E808                      LSR.B   #4,D0
0002D0 0000 0030                 OR.B    #30H,D0
0002D4 12C0                      MOVE.B  D0,(A1)+             SAVE MS ASCII CHAR
0002D6 0201 000F                 AND.B   #0FH,D1
```

```
0002DA 0001 0030          OR.B   #30H,D1
0002DE 12C1               MOVE.B D1,(A1)+           SAVE LS ASCII CHAR
0002E0 51CD FFE8          DBF    COUNT,ASCIILOOP
0002E4 4CD7 0323          MOVEM.L (A7),D0/D1/D5/A0/A1 RESTORE THE REGISTERS
0002E8 4E5E               UNLK   A6                 RESTORE THE STACK
0002EA 4E75               RTS
                          END

Errors=   0

00000000 1  "68000" PREPROCESS
00000000 1  #DEFINE M68000 TRUE
00000000 1  (*************************************************************************)
00000000 1  (**********  FORMATTER ***************************************************)
00000000 1  (*************************************************************************)
00000000 1  (* ROUTINES FOR FORMATTING  8,16,32 BIT SIGNED AND UNSIGNED INTEGERS ******************)
00000000 1  (*              AND FOR     5 - 32 BYTES  UNSIGNED                        *)
00000000 1  (*              STRUCTURES >8 CAN ONLY BE FORMATED IN HEX                 *)
00000000 1  (*************************************************************************)
00000000 1  $PARS
00000000 1  PROGRAM PFORMATER;
00000000 1  $LIB_ABS_LONG$
00000000 1  $CALL_ABS_LONG+$
00000000 1  $EXTENSIONS ON$
00000000 1  $WIDTH 120$
00000000 1  #INCLUDE "TYPES:KIP"
00000000 1  $EXTVAR ON$
00000000 1  VAR ZERO:INTEGER;
00000000 1  $EXTVAR OFF$
00000000 1  (*************************************************************************)
00000000 1  (*  LOCAL STATICS MAY BE IN ANY L-MAP BUT MUST ALL BE IN SAME L_MAP.       *)
00000000 1  (*  THEY ARE NOT DYNAMIC FOR FEAR THAT THEY COULD CROSS AN L-MAP BOUNDRY.  *)
00000000 1  (*************************************************************************)
00000000 1  TYPE     (* REQUIRED TO HANDLE INTEGER FORMATTING FOR >4 BYTES *)
00000000 1  #IF M68000
00000000 1            (* REQUIRED TO HANDLE INTEGER FORMATTING FOR > 4 BYTES *)
00000000 1  DEST_TYPE  =ARRAY[0..31] OF INT;     (*BIG ENOUGH FOR A 64 BIT # FORMATED IN BINARY*)
00000000 1  TABLE_TYPE =ARRAY[0..32] OF INT; (*BIG ENOUGH TO HOLD 16 WORDS OF DATA + FORMATTING INFO  *)
00000000 1  VAR
00000000 1  LONG_SOURCE: ARRAY[0..31] OF BYTE;
00000020 1  #ELSE
00000020 1  TABLE_TYPE =ARRAY[0..2]  OF INT;     (*PARAMETER TABLE FOR GORDONS FORMATER*)
00000020 1  DEST_TYPE  =ARRAY[0..15] OF INT;     (*BIG ENOUGH FOR A 64 BIT # FORMATED IN BINARY*)
00000020 1  VAR
00000020 1  #ENDIF
00000020 1  LOCAL_SOURCE: INTEGER;
00000024 1  LOCAL_DEST  : DEST_TYPE;
00000064 1  TABLE       : TABLE_TYPE;            (*GORDONS FORMATTER TABLE*)
00000000 1  (*****************************************************************************************)
00000000 1  (**********  EXTERNAL PROCEDURES *********************************************************)
00000000 1  (*****************************************************************************************)
00000000 1  #IF M68000
00000000 1  PROCEDURE     P_FORMATTER  (VAR TABLE:TABLE_TYPE; VAR DEST:DEST_TYPE);EXTERNAL;
00000000 1  PROCEDURE OUTIT          (LETTER:CHAR;VALUE:INT;BASE:CHAR); EXTERNAL;
00000000 1  #ELSE
00000000 1  PROCEDURE     FORMATTER    (VAR TABLE:TABLE_TYPE; VAR DEST:DEST_TYPE);EXTERNAL;
00000000 1  #ENDIF
00000000 1  PROCEDURE     MOVEBYTES    (SOURCE:PTR; SOURCE_OFFSET:INT; DEST:PTR; DEST_OFFSET:INT; COUNT:INT); EXTERNAL;
00000000 1  PROCEDURE     GETCHAR      (SOURCE:PTR; SOURCE_OFFSET:INT; VAR CHARACTER:CHAR); EXTERNAL;
00000000 1  PROCEDURE     PUTCHAR      (DEST:PTR; DEST_OFFSET:INT; CHARACTER:CHAR); EXTERNAL;
00000000 1  PROCEDURE     SUBTRACT32   (OP1,OP2:INTEGER; VAR RESULT:INTEGER);EXTERNAL;
000000A6 1  $PAGE$
000000A6 1  $GLOBPROC ON$
00000000 1  (*****************************************************************************************)
00000000 1  (**********  FORMAT INTEGERS *************************************************************)
00000000 1  (*****************************************************************************************)
00000000 1  (* FORMAT BYTE,WORD OR LONG WORD INTEGERS IN SIGNED OR UNSIGNED FORM                      *)
00000000 1  (*****************************************************************************************)
00000000 1  (* SIGN_FLAG    0=UNSIGNED. 1=SIGNED                                                     *)
00000000 1  (* SOURCE       ADDRESS OF SOURCE DATA  (1,2 or 4 BYTES LEFT JUSTIFIED AND PACKED.        *)
00000000 1  (* SOURCESIZE   #OF BYTES OF SOURCE DATA                                                 *)
00000000 1  (* DEST         ADDRESS OF DESTINATION  (MAY BE ANYWHERE IN 68000 MEMORY) (WORD BOUNDRY)  *)
00000000 1  (* DEST_OFFSET  BYTE OFFSET FROM DEST                                                    *)
00000000 1  (* DESTSIZE     CALLED WTH MAX DEST FIELD SIZE (CHARACTERS), RET ACUTAL SIZE IFF JUSTIFY=LEFT.  *)
00000000 1  (* BASE         FORMATTING BASE = 2,8,10 OR 16                                           *)
```

```
00000000  1  (* JUSTIFY      1==>LEFT  ==> LEFT  JUSTIFY, LENGTH RETURNED IN DESTSIZE.                        *)
00000000  1  (* JUSTIFY     -1==>RIGHT ==> RIGHT JUSTIFY, LEFT TRUNCATE, BLANK FILL IN FIELD OF SIZE DESTSIZE.*)
00000000  1  (*               HEX, OCTAL AND BINARY ZERO FILL THE FIELD.                                      *)
00000000  1  (*****************************************************************************************************)
00000000  1  PROCEDURE FORMAT       (SIGN_FLAG:INT;SOURCE:INTEGER_PTR; SOURCESIZE:INT;
00000000  2                         DEST:PTR; DEST_OFFSET:INT; VAR DESTSIZE:INT; BASE:INT; JUSTIFY:INT);
00000000  2  CONST
00000000  2  HEX=3000H;       (*    BASE SYMBOL, NO ZERO SUPPRESS*)
00000000  2  OCT=3040H;       (*    BASE SYMBOL, NO ZERO SUPPRESS*)
00000000  2  BIN=3080H;       (*    BASE SYMBOL, NO ZERO SUPPRESS*)
00000000  2  DEC=22C0H;       (* NO BASE SYMBOL,    ZERO SUPPRESS*)
00000000  2  VAR
00000000  2  FIRST     :INT;
00000002  2  NEGATIVE  :BOOLEAN;
00000003  2  TEMP      :INT;                 (*FOR REARRANGING WORDS IN DATA*)
00000006  2  CHARACTER :CHAR;
00000004  2  (*********************************************************************************)
00000004  2  (**********  FORMAT INTEGERS MAIN PROGRAM ****************************************)
00000004  2  (*********************************************************************************)
00000004  2  BEGIN
00000004  2  LOCAL_SOURCE:=INTEGER(SOURCE^);        (*GET A LOCAL COPY OF SOURCE, 1,2 OR 4 BYTES, LEFT JUSTIFIED*)
0000000E  2  IF (SIGN_FLAG=SIGNED) AND (LOCAL_SOURCE[0]<0) THEN
0000002E  2    BEGIN
0000002E  2    NEGATIVE:=TRUE;
00000034  2
00000034  2    CASE SOURCESIZE OF
0000003E  2      1:  BEGIN
0000003E  2          LOCAL_SOURCE[0]:=SHIFT(SHIFT(LOCAL_SOURCE[0],-8),8);  (*CLEAR LS BYTE*)
0000004E  2          LOCAL_SOURCE[0]:=0-LOCAL_SOURCE[0];                   (*TWO'S COMPLEMENT 1 BYTE *)
0000005A  2          END;
0000005E  2      2:  LOCAL_SOURCE[0]:=0-LOCAL_SOURCE[0];                   (*TWO'S COMPLEMENT 2 BYTES*)
00000072  2      4:  SUBTRACT32(ZERO,LOCAL_SOURCE,LOCAL_SOURCE);             (*TWO'S COMPLEMENT 4 BYTES*)
00000094  2    OTHERWISE;
00000094  2    END (*END CASE*)
000000BC  2    END
000000C0  2    ELSE NEGATIVE:=FALSE;
000000C4  2  CASE BASE OF
000000CE  2    2 :TABLE[0]:=BIN+DESTSIZE-1; (*   DISPLAY BASE ==> #DIGITS=DESTSIZE-1  (LEAVE 1 CHAR FOR BASE SYMBOL)*)
000000E4  2    8 :TABLE[0]:=OCT+DESTSIZE-1; (*   DISPLAY BASE ==> #DIGITS=DESTSIZE-1  (LEAVE 1 CHAR FOR BASE SYMBOL)*)
000000FA  2    10:TABLE[0]:=DEC+DESTSIZE  ; (*NO DISPLAY BASE ==> #DIGITS=DESTSIZE                                  *)
0000010E  2    16:TABLE[0]:=HEX+DESTSIZE-1; (*   DISPLAY BASE ==> #DIGITS=DESTISZE-1  (LEAVE 1 CHAR FOR BASE SYMBOL)*)
00000124  2    OTHERWISE;
00000124  2    END; (*END CASE*)
00000162  2  CASE SOURCESIZE OF
0000016C  2    1 :LOCAL_SOURCE[0]:=SHIFT(LOCAL_SOURCE[0],-8);(*PUT BYTE IN LSB OF WORD FOR GORDON*)
0000017E  2    2 :;
00000182  2    4 :BEGIN  (*FORMAT 4 BYTE*)
00000182  2       TEMP:=LOCAL_SOURCE[0];  LOCAL_SOURCE[0]:=LOCAL_SOURCE[1];  LOCAL_SOURCE[1]:=TEMP; (*PUT LSW FIRST FOR GORDON*)
0000019C  2       TABLE[0]:=TABLE[0]+0400H;  (*2 WORD SOURCE*)
000001A4  2       END;   (*FORMAT 4 BYTE*)
000001A8  2    OTHERWISE;
000001A8  2    END; (*END CASE*)
000001D0  2  TABLE[2]:=0;   (*END OF TABLE*)
000001D6  2  $WARN OFF$
000001D6  2  #IF M68000
000001D6  2  TABLE[1]:=SHIFT(SHIFT(INT(ADDR(LOCAL_SOURCE)),+1),-2)+4000H;    (*COMPUTE BPC SPACE SOURCE ADDRESS*)
000001EC  2  P_FORMATTER(TABLE,LOCAL_DEST);    (*68000 INTERFACE TO GORDON'S BPC FORMATER*)
00000200  2  #ELSE
00000200  2  TABLE[1]:=INT(ADDR(LOCAL_SOURCE));    (*COMPUTE BPC SPACE SOURCE ADDRESS*)
00000200  2  FORMATTER(TABLE,LOCAL_DEST);       (*GORDON'S BPC FORMATTER*)
00000200  2  #ENDIF
00000200  2  $WARN ON $
00000200  2  $PAGE$
00000200  2  (*CHARACTER DATA IS NOW IN LOCAL_DEST, RIGHT JUSTIFIED TO DESTSIZE-1  *)
00000200  2  FIRST:=-1;          (*BYTE INDEX INTO LOCAL DEST*)
00000206  2  CHARACTER:=" ";     (*FORCE FIRST TIME THROUGH LOOP*)
0000020C  2  WHILE CHARACTER=" " DO BEGIN  FIRST:=FIRST+1; GETCHAR(PTR(ADDR(LOCAL_DEST)),FIRST,CHARACTER);  END;
0000023A  2  IF NEGATIVE THEN
00000242  2    BEGIN (*FORMAT THE NEGATIVE SIGN*)
00000242  2    FIRST:=FIRST-1;
00000246  2    PUTCHAR(PTR(ADDR(LOCAL_DEST)),FIRST,"-");
0000025E  2    END;  (*FORMAT THE NEGATIVE SIGN*)
0000025E  2
0000025E  2
0000025E  2  IF JUSTIFY=LEFT THEN
00000266  2    BEGIN (*LEFT  JUSTIFY*)
```

```
00000266  2    DESTSIZE:=DESTSIZE-FIRST;
00000270  2    MOVEBYTES(PTR(ADDR(LOCAL_DEST)),FIRST,DEST, DEST_OFFSET, DESTSIZE);
00000296  2    END  (*LEFT  JUSTIFY*)
0000029A  2    ELSE  (*RIGHT JUSTIFY*)
0000029A  2    MOVEBYTES(PTR(ADDR(LOCAL_DEST)),0,    DEST, DEST_OFFSET, DESTSIZE);
000002BE  2  #IF NOT M68000
000002BE  2  END;. (* FORMATER *)
000002BE  2  #ELSE
000002BE  2  END;
00000000  1  $PAGE$
00000000  1  $GLOBPROC ON$
00000000  1  (**************************************************************************************************)
00000000  1  (************************* LONG_FMT ***************************************************************)
00000000  1  (**************************************************************************************************)
00000000  1  (* FORMATS INTEGERS LONGER THAN 4 BYTES  IN  UNSIGNED FORM ONLY! LEFT JUSTIFIES                   *)
00000000  1  (* THIS IS CALLED ONLY BY CHANGE_BASE. IT IS REQUIRED FOR LONG REALS AND SETS                     *)
00000000  1  (* THIS IS ONLY USED FOR SODA                                                                    *)
00000000  1  (* FOR STRUCTURES >8 BYTES IT IS ASSUMED CHANGE CAN ONLY BE TO HEX                               *)
00000000  1  (**************************************************************************************************)
00000000  1  (* STRUC        SOURCE DATA  (5 BYTES OR MORE LEFT JUSTIFIED AND PACKED.                         *)
00000000  1  (* STRUCSIZE    #OF BYTES OF SOURCE DATA                                                         *)
00000000  1  (* DEST         ADDRESS OF DESTINATION  (MAY BE ANYWHERE IN 68000 MEMORY) (WORD BOUNDRY)         *)
00000000  1  (* DEST_OFFSET  BYTE OFFSET FROM DEST                                                            *)
00000000  1  (* DESTSIZE     CALLED WTH MAX DEST FIELD SIZE (CHARACTERS), RET ACTUAL SIZE IFF JUSTIFY=LEFT.   *)
00000000  1  (* BASE         FORMATTING BASE = 2,8,10 OR 16                                                   *)
00000000  1  (*              THIS WILL ALWAYS LEFT  JUSTIFY, RETURNING LENGTH IN DESTSIZE:                    *)
00000000  1  (*              HEX, OCTAL AND BINARY ZERO FILL THE FIELD.                                       *)
00000000  1  (**************************************************************************************************)
00000000  1  PROCEDURE LONG_FMT      (VAR STRUC:STRUC_TYPE; STRUCSIZE:INT;
00000000  2                          DEST:PTR; DEST_OFFSET:INT; VAR DESTSIZE:INT; BASE:INT);
00000000  2  CONST
00000000  2  HEX=3000H;      (*    BASE SYMBOL, NO ZERO SUPPRESS*)
00000000  2  HEXWORD=2004H;  (* NO BASE SYMBOL, NO ZERO SUPPRESS, ONE WORD - USED FOR >8 BYTES OF DATA*)
00000000  2  HEXEND=3004H;   (*    BASE SYMBOL, NO ZERO SUPPRESS, ONE WORD - USED FOR >8 BYTES OF DATA *)
00000000  2  OCT=3040H;      (*    BASE SYMBOL, NO ZERO SUPPRESS*)
00000000  2  BIN=3080H;      (*    BASE SYMBOL, NO ZERO SUPPRESS*)
00000000  2  DEC=22C0H;      (* NO BASE SYMBOL,    ZERO SUPPRESS*)
00000000  2  VAR
00000000  2  FIRST     :INT;
00000002  2  CHARACTER :CHAR;
00000003  2  INDEX     :INT;
00000006  2  SUB_INDEX :INT;    (* HOLDS WORD INDEX INTO STRUC AND/OR TABLE *)
000002C6  2  (*****************************************************************************************)
000002C6  2  (*********** LONG FORMAT OF INTEGERS MAIN PROGRAM ****************************************)
000002C6  2  (*****************************************************************************************)
000002C6  2  BEGIN
000002C6  2  INDEX := 0;
000002CA  2  IF STRUCSIZE <=8 THEN
000002D6  2   BEGIN (* GET A COPY OF STRUC INTO LONG_SOURCE, WORD BACKWORDS *)
000002D6  2    SUB_INDEX := STRUCSIZE - 2;   (* INITIALIZE TO LAST WORD OF STRUC *)
000002DC  2    WHILE SUB_INDEX >= -1 DO BEGIN
000002E8  2     IF SUB_INDEX > -1 THEN  (* MOVE TWO BYTES IN *)
000002F0  2      BEGIN
000002F0  2       LONG_SOURCE[INDEX] := STRUC[SUB_INDEX];
00000304  2       LONG_SOURCE[INDEX + 1] := STRUC[SUB_INDEX + 1];
00000320  2      END  (* IF - THEN *)
00000324  2      ELSE BEGIN   (* THIS IS LAST WORD AND ONLY HAS ONE VALID BYTE *)
00000324  2       LONG_SOURCE[INDEX] := 00H;
00000332  2       LONG_SOURCE[INDEX + 1] := STRUC[0];
00000346  2      END;   (* ELSE *)
00000346  2     SUB_INDEX := SUB_INDEX - 2;
0000034A  2     INDEX := INDEX + 2;
0000034E  2    END;  (* WHILE *)
00000350  2    INDEX := INDEX - 2;  (* RESET INDEX TO LAST WORD IN THE ARRAY *)
00000354  2       (* STRUCTURE CAN BE SENT IN ONE CHUNK *)
00000354  2   CASE BASE OF
0000035E  2    2 : IF DESTSIZE <> 65 THEN
0000036C  2          TABLE[0]:=BIN+DESTSIZE-1  (*   DISPLAY BASE ==> #DIGITS=DESTSIZE-1  (LEAVE 1 CHAR FOR BASE SYMBOL)*)
0000037C  2         ELSE
0000037C  2          TABLE[0]:=BIN  ;        (*   DISPLAY BASE ==> #DIGITS=64 THEN USE 0  FOR FORMATTER *)
00000388  2    8 :TABLE[0]:=OCT+DESTSIZE-1; (*   DISPLAY BASE ==> #DIGITS=DESTSIZE-1  (LEAVE 1 CHAR FOR BASE SYMBOL)*)
0000039E  2    10:TABLE[0]:=DEC+DESTSIZE  ; (*NO DISPLAY BASE ==> #DIGITS=DESTSIZE                                 *)
000003B2  2    16:TABLE[0]:=HEX+DESTSIZE-1; (*   DISPLAY BASE ==> #DIGITS=DESTISZE-1  (LEAVE 1 CHAR FOR BASE SYMBOL)*)
000003C8  2    OTHERWISE;
000003C8  2    END; (*END CASE*)
```

```
00000406 2  CASE STRUCSIZE OF   (* THIS CAN ONLY BE  >4 AND <= 8 *)
00000410 2   5,6 : TABLE[0]:= TABLE[0] + 0800H; (* 3 WORD SOURCE *)
0000041C 2   7,8 : TABLE[0]:= TABLE[0] + 0C00H, (* 4 WORD SOURCE *)
00000428 2   OTHERWISE;
00000428 2   END; (* CASE *)
00000450 2 $WARN OFF
00000450 2  TABLE[1] := SHIFT(SHIFT(INT(ADDR(LONG_SOURCE[0])),+1),-2)+4000H; (* COMPUTE BPC SOURCE ADDR *)
00000466 2 $WARN ON
00000466 2  TABLE[2] :=0;   (*END OF TABLE*)
0000046C 2  END   (* IF-THEN *)
00000470 2  ELSE BEGIN (* OVER 8 BYTES SO SET UP TABLE TO DO HEX ONE WORD ENTRIES *)
00000470 2   SUB_INDEX := 0;
00000474 2   WHILE SUB_INDEX <=STRUCSIZE -1 DO BEGIN
00000484 2      LONG_SOURCE[INDEX] := STRUC[SUB_INDEX];
00000498 2    SUB_INDEX := SUB_INDEX + 1;
0000049C 2    INDEX := INDEX + 1;
000004A0 2   END;  (* WHILE *)
000004A2 2   INDEX := 0;   (* SET UP TO SHIP TO FORMATTER *)
000004A6 2   SUB_INDEX := 0;
000004AA 2   WHILE INDEX <=STRUCSIZE-1 DO BEGIN
000004BA 2    IF INDEX < STRUCSIZE -2 THEN  (* NOT ON LAST WORD *)
000004C6 2     TABLE[SUB_INDEX] := HEXWORD
000004DC 2     ELSE    (* FORMATTING LAST WORD *)
000004DC 2      IF INDEX = STRUCSIZE - 2 THEN (* LAST WORD IS FULL *)
000004EC 2       TABLE[SUB_INDEX] := HEXEND
00000502 2      ELSE BEGIN    (* LAST WORD ONLY HAS A BYTE *)
00000502 2       TABLE[SUB_INDEX] := HEXEND - 2;
00000514 2       LONG_SOURCE[INDEX+1] := LONG_SOURCE[INDEX];
0000052A 2       LONG_SOURCE[INDEX] := 00H
00000538 2      END;   (* ELSE *)
00000538 2 $WARN OFF$
00000538 2    TABLE[SUB_INDEX + 1] := SHIFT(SHIFT(INT(ADDR(LONG_SOURCE[INDEX])),+1),-2)+4000H; (* GET BPC SOURCE ADDR *)
00000562 2 $WARN ON$
00000562 2    INDEX := INDEX + 2;
00000566 2    SUB_INDEX  := SUB_INDEX + 2;
0000056A 2   END;  (* DO LOOP *)
0000056E 2   TABLE[SUB_INDEX] := 0;  (* END OF DATA *)
0000057E 2  END;  (* ELSE *)
0000057E 2 P_FORMATTER(TABLE,LOCAL_DEST);    (*68000 INTERFACE TO GORDON'S BPC FORMATER*)
00000592 2 $PAGE$
00000592 2 (*CHARACTER DATA IS NOW IN LOCAL_DEST, RIGHT JUSTIFIED TO DESTSIZE-1  *)
00000592 2 FIRST:=-1;         (*BYTE INDEX INTO LOCAL DEST*)
00000598 2 CHARACTER:=" ";     (*FORCE FIRST TIME THROUGH LOOP*)
0000059E 2 WHILE CHARACTER=" " DO BEGIN  FIRST:=FIRST+1; GETCHAR(PTR(ADDR(LOCAL_DEST)),FIRST,CHARACTER);  END;
000005CC 2 DESTSIZE:=DESTSIZE-FIRST;
000005D6 2 MOVEBYTES(PTR(ADDR(LOCAL_DEST)),FIRST,DEST, DEST_OFFSET, DESTSIZE);
000005FC 2 END;. (* FORMATER *)
00000000 1 #ENDIF
```

End of compilation, number of errors=    0

```
00000000 1 "68000" PREPROCESS
00000000 1 #DEFINE M68000 TRUE
00000000 1 PROGRAM FORMAT_REAL_;
00000000 1 $EXTENSIONS ON$
00000000 1 #INCLUDE TYPES:KIP
00000000 1 (#INCLUDE TYPES:INCLUD)
00000000 1 (#INCLUDE DECL:INCLUD)
00000000 1 CONST
00000000 1    MANT_WORDS = 5;   (NUMBER OF WORDS OF MANTISSA IN UNPACKED FORMAT)
00000000 1    SHORT = 2;
00000000 1    LONG = 4;
00000000 1
00000000 1 TYPE
00000000 1 #IF M68000
00000000 1    BITS = (BIT8,BIT9,BIT10,BIT11,BIT12,BIT13,BIT14,BIT15,
00000000 1            BIT0,BIT1,BIT2,BIT3,BIT4,BIT5,BIT6,BIT7);
00000000 1 #ELSE
00000000 1    BITS = (BIT0,BIT1,BIT2,BIT3,BIT4,BIT5,BIT6,BIT7,
00000000 1            BIT8,BIT9,BIT10,BIT11,BIT12,BIT13,BIT14,BIT15) ;
00000000 1 #ENDIF
00000000 1    SOB = SET OF BITS ;
00000000 1
00000000 1 CONST
00000000 1    ML4 = SOB[BIT0,BIT1,BIT2,BIT3];
00000000 1    ML14 = SOB[BIT0,BIT1,BIT2,BIT3,BIT4,BIT5,BIT6.BIT7,BIT8,BIT9,BIT10,BIT11,BIT12,BIT13];
```

```
00000000  1     ML15 = SOB[BIT0,BIT1,BIT2,BIT3,BIT4,BIT5,BIT6,BIT7,BIT8,BIT9,BIT10,BIT11,BIT12,BIT13,BIT14];
00000000  1     B15 = SOB[BIT15];
00000000  1  TYPE
00000000  1     GENERIC = RECORD CASE INT OF
00000000  2        0 : (I:INT);
00000000  2        1 : (S:SOB);
00000000  1     END;
00000000  1     MANTYPE = ARRAY[0..MANT_WORDS - 1] OF GENERIC;
00000000  1     LONG_REAL = ARRAY[0..3] OF GENERIC;
00000000  1     REAL_RAY = ARRAY[0..7] OF BYTE;
00000000  1     UNP_REAL = RECORD
00000000  2        EXPONENT : INT;   {MIN_EXPONENT..MAX_EXPONENT}
00000000  2        MANTISSA : MANTYPE;   {LEFT JUSTIFIED, x.ffffffff...}
00000000  1     END;
00000000  1  VAR
00000000  1   REALSIZE : INT;
00000002  1   EBITS : INT;
00000004  1   MBITS : INT;
00000006  1   MIN_EXPONENT,MAX_EXPONENT : INT;
0000000A  1   NEGATIVE : BOOLEAN;
0000000B  1   EXP : CHAR;
0000000C  1
0000000C  1  {
0000000C  1          Short real:68000                        Short real:8086
0000000C  1
0000000C  1          -----------------------------------     -----------------------------------
0000000C  1         |                                   |   |                                   |
0000000C  1  WORD 0 | S E E E E E E E E M M M M M M M   |   | M M M M M M M M M M M M M M M M   |   -n.mmmmmE-ee  (12 chars)
0000000C  1         |                                   |   |                                   |
0000000C  1          -----------------------------------     -----------------------------------
0000000C  1         |                                   |   |                                   |
0000000C  1  WORD 1 | M M M M M M M M M M M M M M M M   |   | S E E E E E E E E M M M M M M M   |
0000000C  1         |                                   |   |                                   |
0000000C  1          -----------------------------------     -----------------------------------
0000000C  1
0000000C  1
0000000C  1
0000000C  1
0000000C  1
0000000C  1
0000000C  1
0000000C  1          Long  real: 68000                       Long  real: 8086
0000000C  1
0000000C  1          -----------------------------------     -----------------------------------
0000000C  1         |                                   |   |                                   |
0000000C  1  WORD 0 | S E E E E E E E E E E E M M M M   |   | M M M M M M M M M M M M M M M M   |   -n.mmmmmmmmmmmmmmE-eee  (22 c
0000000C  1         |                                   |   |                                   |
0000000C  1          -----------------------------------     -----------------------------------
0000000C  1         |                                   |   |                                   |
0000000C  1  WORD 1 | M M M M M M M M M M M M M M M M   |   | M M M M M M M M M M M M M M M M   |
0000000C  1         |                                   |   |                                   |
0000000C  1          -----------------------------------     -----------------------------------
0000000C  1         |                                   |   |                                   |
0000000C  1  WORD 2 | M M M M M M M M M M M M M M M M   |   | M M M M M M M M M M M M M M M M   |
0000000C  1         |                                   |   |                                   |
0000000C  1          -----------------------------------     -----------------------------------
0000000C  1         |                                   |   |                                   |
0000000C  1  WORD 3 | M M M M M M M M M M M M M M M M   |   | S E E E E E E E E E E E M M M M   |
0000000C  1         |                                   |   |                                   |
0000000C  1          -----------------------------------     -----------------------------------
0000000C  1  }
0000000C  1
0000000C  1  $FARS
00000000  1  PROCEDURE PUTCHAR(DEST:PTR; DEST_OFST:INT;CR:CHAR);EXTERNAL;
00000000  1  PROCEDURE MOVEBYTES        (SOURCE:PTR; SOURCE_OFFSET:INT; DEST:PTR; DEST_OFFSET:INT; COUNT:INT); EXTERNAL;
00000000  1
00000000  1  PROCEDURE REAL_LONG ;
00000004  2  BEGIN
00000004  2    REALSIZE := LONG ;
0000000A  2    EBITS := 11;
00000010  2    MBITS := 52;
00000016  2    MIN_EXPONENT := -1023;
0000001C  2    MAX_EXPONENT := 1024;
00000022  2    EXP := 'L';
00000028  2  END ;
```

```
00000000  1
00000000  1  PROCEDURE REAL_SHORT ;
00000030  2  BEGIN
00000030  2     REALSIZE := SHORT ;
00000036  2     EBITS := 8;
0000003C  2     MBITS := 23;
00000042  2     MIN_EXPONENT := -127;
00000048  2     MAX_EXPONENT := 128;
0000004E  2     EXP := 'E';
00000054  2  END ;
00000000  1
00000000  1  PROCEDURE SLEFT(VAR MANT:MANTYPE);
00000000  2  VAR TEMP : SOB;
00000002  2      CARRY : GENERIC;
00000004  2      I : INT;
0000005C  2  BEGIN
0000005C  2   CARRY.I := 0,
00000060  2   FOR I := 0 TO MANT_WORDS - 1 DO
00000064  2    BEGIN
00000064  2     TEMP := SHIFT(MANT[I].S,-15);
0000007C  2     MANT[I].S := SHIFT(MANT[I].S,1) + CARRY.S;
00000096  2     CARRY.S := TEMP;
0000009C  2    END;
000000AC  2  END;
00000000  1
00000000  1  PROCEDURE ADD_HI(VAR MANT:MANTYPE);
000000B4  2  BEGIN
000000B4  2   MANT[MANT_WORDS-1].S := MANT[MANT_WORDS-1].S + B15;
000000C4  2  END;
00000000  1
00000000  1  PROCEDURE UNPACK_REAL(R:REAL_RAY; VAR UR:UNP_REAL);
00000000  2  VAR
00000000  2   I,J,INDEX,RLSZ : INT;
00000008  2   G : GENERIC;
0000000A  2   TEMP : SOB;
0000000C  2   R_TEMP : LONG_REAL;
000000D8  2  BEGIN
000000D8  2   RLSZ := REALSIZE * 2;
000000E4  2   I := 0;
000000E8  2   WHILE I <= RLSZ - 1 DO
000000F8  2    BEGIN
000000F8  2     J := RLSZ - I - 2;
00000104  2     TEMP := SOB(SHIFT(INT(R[J]),8)) + SOB(SHIFT(SHIFT(INT(R[J+1]),8),-8));
00000126  2     R_TEMP[(I DIV 2)].S := TEMP;
00000136  2     I := I + 2;
0000013A  2    END;
0000013C  2   FOR INDEX := 0 TO REALSIZE - 1 DO
00000152  2      UR.MANTISSA[5 + INDEX - REALSIZE] := R_TEMP[INDEX];
00000188  2   NEGATIVE := SHIFT(UR.MANTISSA[MANT_WORDS-1].I,-15) = 1;
000001A8  2   FOR INDEX := 0 TO 4 - REALSIZE DO
000001C2  2      UR.MANTISSA[INDEX].I := 0;
000001E6  2   FOR INDEX := 1 TO EBITS DO
000001FC  2      SLEFT(UR.MANTISSA);
0000021C  2   G.S := R_TEMP[REALSIZE - 1].S * ML15;
00000234  2   G.I := SHIFT(G.I,EBITS - 15);
00000250  2   UR.EXPONENT := G.I + MIN_EXPONENT;
0000025A  2   UR.MANTISSA[MANT_WORDS - 1].S := UR.MANTISSA[MANT_WORDS - 1].S * ML15;
00000272  2   IF UR.EXPONENT = MIN_EXPONENT THEN
00000280  2      UR.EXPONENT := 1 + MIN_EXPONENT
00000290  2*  ELSE IF UR.EXPONENT <> MAX_EXPONENT THEN
0000029E  2      ADD_HI(UR.MANTISSA);
000002AC  2  END;
00000000  1
00000000  1  FUNCTION ZERO(MANT:MANTYPE):BOOLEAN;
00000001  2  VAR
00000001  2   I : INT;
000002C4  2  BEGIN
000002C4  2   ZERO := TRUE;
000002CA  2   FOR I := 0 TO MANT_WORDS-1 DO
000002CE  2    BEGIN
000002CE  2     IF MANT[I].I <> 0 THEN ZERO := FALSE;
000002E4  2    END;
000002F4  2  END;
00000000  1
00000000  1  FUNCTION NORM(VAR MANT:MANTYPE):BOOLEAN;
00000302  2  BEGIN
00000302  2   NORM := MANT[MANT_WORDS-1].I < 0;
```

```
00000314  2  END;
00000000  1
00000000  1  $GLOBPROC+$
00000000  1  (*****************************************************************************)
00000000  1  (********** FORMAT REALS ******************************************************)
00000000  1  (*****************************************************************************)
00000000  1  (*INPUTS                                                                     *)
00000000  1  (*STRUC        4 or 8 bytes of real number                                   *)
00000000  1  (*SIZE         # of bytes in STRUC = 4 or 8.                                 *)
00000000  1  (*****************************************************************************)
00000000  1  (*OUTPUTS                                                                    *)
00000000  1  (*TEXT         STRNG of formatted data                                       *)
00000000  1  (*****************************************************************************)
00000000  1  PROCEDURE FORMATREAL(VAR STRUC:STRUC_TYPE;VAR TEXT:STRNG; SIZE:INT);
00000000  2  VAR
00000000  2  $EXTVAR ON$
00000000  2  E006:STRNG; (* "+infinity" *)
00000000  2  E007:STRNG; (* "-infinity" *)
00000000  2  E008:STRNG; (* "Not a number" *)
00000000  2  $EXTVAR OFF$
00000000  2   SOURCE:STRNG_PTR; (*FOR MOVING ERROR STRING*)
00000004  2   R : REAL_RAY;
0000000C  2   INDEX,DECEXP,I : INT;
00000012  2   CARRY,NCARRY : INT;
00000016  2   TEMP : INT;
00000018  2   C : CHAR;
00000019  2   Z : BOOLEAN;
0000001A  2   U_RESULT : UNP_REAL;
00000026  2   DIGITS,BITVALUE : ARRAY[1..52] OF INT;
00000000  2  #IF M68000
00000000  2  #ELSE
00000000  2   $EXTVAR+$
00000000  2     RSTACKSIZE:INT;
00000000  2   $EXTVAR-$
00000000  2  #ENDIF
00000000  2
00000000  2  PROCEDURE TEMPADJUST ;
00000322  3  BEGIN
00000322  3     IF TEMP > 9 THEN
00000332  3     BEGIN
00000332  3        TEMP := TEMP - 10 ;
00000338  3        CARRY := 1 ;
0000033E  3     END
00000342  3     ELSE CARRY := 0 ;
0000034A  3  END ;
00000000  2
00000000  2  PROCEDURE WRITE_CHAR(C:CHAR);
00000352  3  BEGIN
00000352  3  (BEGIN TEXT.BUFF[TEXT.LEN]:=C; TEXT.LEN:=TEXT.LEN+1; END;)
00000352  3   WITH TEXT DO
0000035E  3    BEGIN
0000035E  3     PUTCHAR(PTR(ADDR(ASCII[0])),LEN,C);
00000370  3     LEN := LEN + 1;
00000376  3    END;
00000376  3  END;
00000000  2
00000000  2  $RECURSIVE+$
00000000  2  PROCEDURE WRITE_INT(I:INT);
0000037E  3  BEGIN
0000037E  3  IF I < 0 THEN BEGIN WRITE_CHAR('-'); I:=-I; END;
00000396  3  IF I >= 10 THEN WRITE_INT(I DIV 10);
000003B2  3  WRITE_CHAR(CHR(I MOD 10 + ORD('0')));
000003D6  3  END;
00000000  2  $RECURSIVE-$
000003DE  2
000003DE  2  BEGIN
000003DE  2   IF SIZE = 8
000003EA  2    THEN REAL_LONG
000003F2  2    ELSE REAL_SHORT;
000003F6  2   FOR I := 0 TO REALSIZE*2 - 1 DO
00000410  2    BEGIN
00000410  2     R[I] := STRUC[I];
00000426  2    END;
00000438  2   UNPACK_REAL(R,U_RESULT);
00000446  2   Z := ZERO(U_RESULT.MANTISSA);
```

```
00000454  2   IF U_RESULT.EXPONENT = MAX_EXPONENT THEN
00000460  2     BEGIN  (*error*)
00000460  2     IF Z
00000468  2       THEN IF NEGATIVE
00000470  2         THEN SOURCE:=STRNG_PTR(ADDR(E006))    (* "-infinity" *)
0000047E  2         ELSE SOURCE:=STRNG_PTR(ADDR(E007))    (* "+infinity" *)
0000048C  2       ELSE   SOURCE:=STRNG_PTR(ADDR(E008));  (* "Not a number" *)
00000496  2     MOVEBYTES(PTR(SOURCE), 0, PTR(ADDR(TEXT)), 0, SOURCE^.LEN+2);
000004B8  2     END    (*error*)
000004BC  2   ELSE
000004BC  2   BEGIN
000004BC  2     IF NEGATIVE THEN WRITE_CHAR('-')
000004D6  2     ELSE WRITE_CHAR(' ') ;
000004E4  2     IF Z THEN
000004EC  2     BEGIN
000004EC  2        WRITE_CHAR('0') ;
000004FA  2        WRITE_CHAR('.') ;
00000508  2        WRITE_CHAR('0') ;
00000516  2     END
0000051A  2     ELSE
0000051A  2     BEGIN
0000051A  2        FOR INDEX := 1 TO NBITS DO
00000530  2        BEGIN
00000530  2           BITVALUE[INDEX] := 0 ;
00000540  2           DIGITS[INDEX] := 0 ;
00000550  2        END ;
00000562  2        BITVALUE[1] := 1;
00000568  2        FOR INDEX := 1 TO NBITS DO
0000057E  2        BEGIN
0000057E  2           IF NORM(U_RESULT.MANTISSA) THEN
0000058E  2           BEGIN
0000058E  2              CARRY := 0 ;
00000592  2              FOR I := NBITS DOWNTO 1 DO
000005A4  2              BEGIN
000005A4  2                 TEMP := DIGITS[I] + BITVALUE[I] + CARRY ;
000005CC  2                 TEMPADJUST ;
000005D6  2                 DIGITS[I] := TEMP ;
000005E8  2              END ;
000005F8  2           END ;
000005F8  2           CARRY := 0 ;
000005FC  2           FOR I := 1 TO NBITS DO
00000612  2           BEGIN
00000612  2              TEMP := BITVALUE[I] ;
00000624  2              BITVALUE[I] := SHIFT(TEMP,-1) + CARRY ;
0000063A  2              IF ODD(TEMP) THEN CARRY := 5
00000650  2              ELSE CARRY := 0 ;
00000654  2           END ;
00000666  2           SLEFT(U_RESULT.MANTISSA) ;
00000670  2        END ;
00000684  2        {find first non_zero digit, and shift over so it is the first
00000684  2         digit.  Zero - #shifts is the initial decimal exponent}
00000684  2        I := 1 ;
0000068A  2        WHILE DIGITS[I] < 1 DO I := I + 1 ;
000006A8  2        DECEXP := I - 1 ;
000006B2  2        FOR INDEX := 1 TO 20 DO
000006B8  2           DIGITS[INDEX] := DIGITS[DECEXP+INDEX] ;
000006E6  2        DECEXP := - DECEXP ;
000006EA  2        DIGITS[21] := 0 ;
000006EE  2        {end of shifting}
000006EE  2        {never use more than 20 digits, since a maximum of 16 will be
000006EE  2         displayed no more are necessary}
000006EE  2        WHILE U_RESULT.EXPONENT > 0 DO
000006F6  2        BEGIN
000006F6  2           U_RESULT.EXPONENT := U_RESULT.EXPONENT - 1;
000006FA  2           IF DIGITS[1] > 4 THEN
00000706  2           BEGIN
00000706  2              DECEXP := DECEXP + 1;
0000070A  2              CARRY := 0 ;
0000070E  2              FOR I := 20 DOWNTO 2 DO
00000714  2              BEGIN
00000714  2                 TEMP := 2 * DIGITS[I - 1] + CARRY;
00000732  2                 TEMPADJUST ;
0000073C  2                 DIGITS[I] := TEMP ;
0000074E  2              END ;
```

```
0000075E  2                 DIGITS[1] := 1;
00000764  2              END
00000768  2              ELSE
00000768  2              BEGIN
00000768  2                 CARRY := 0;
0000076C  2                 FOR I := 20 DOWNTO 1 DO
00000772  2                 BEGIN
00000772  2                    TEMP := 2 * DIGITS[I] + CARRY;
0000078E  2                    TEMPADJUST ;
00000798  2                    DIGITS[I] := TEMP ;
000007AA  2                 END ;
000007BA  2              END ;
000007BA  2           END ;
000007BE  2           WHILE U_RESULT.EXPONENT < 0 DO
000007C6  2           BEGIN
000007C6  2              U_RESULT.EXPONENT := U_RESULT.EXPONENT + 1;
000007CA  2              IF DIGITS[1] < 2 THEN
000007D6  2              BEGIN
000007D6  2                 DECEXP := DECEXP - 1;
000007DA  2                 FOR I := 1 TO 19 DO BEGIN
000007E0  2                       IF ODD(DIGITS[I]) THEN CARRY := 5
00000802  2                       ELSE CARRY := 0;
00000806  2                       DIGITS[I] := SHIFT(DIGITS[I + 1],-1) + CARRY ;
0000082A  2                    END;
0000083A  2                    DIGITS[20] := CARRY ;
00000840  2                 END
00000844  2                 ELSE
00000844  2                 BEGIN
00000844  2                    CARRY := 0;
00000848  2                    FOR I := 1 TO 20 DO
0000084E  2                    BEGIN
0000084E  2                       TEMP := DIGITS[I] ;
00000860  2                       DIGITS[I] := SHIFT(TEMP,-1) + CARRY ;
00000876  2                       IF ODD(TEMP) THEN CARRY := 5
0000088C  2                       ELSE CARRY := 0 ;
00000890  2                    END;
000008A0  2                 END;
000008A0  2              END;
000008A4  2              IF REALSIZE = SHORT THEN I := 6
000008BA  2              ELSE I := 15;
000008C0  2              CARRY := 0;
000008C4  2              IF DIGITS[I + 1] > 4 THEN
000008DE  2              BEGIN
000008DE  2                 CARRY := 1;
000008E4  2                 FOR INDEX := I DOWNTO 1 DO
000008F6  2                 BEGIN
000008F6  2                    TEMP := DIGITS[INDEX] + CARRY;
0000090E  2                    TEMPADJUST ;
00000918  2                    DIGITS[INDEX] := TEMP ;
0000092A  2                 END;
0000093A  2              END;
0000093A  2              TEMP := 2 ;
00000940  2              IF CARRY = 0 THEN
00000948  2                 WRITE_CHAR(CHR(DIGITS[1]+ORD('0')))
00000964  2              ELSE
00000964  2              BEGIN
00000964  2                 WRITE_CHAR('1');
00000972  2                 DECEXP := DECEXP + 1;
00000976  2                 TEMP := 1 ;
0000097C  2              END ;
0000097C  2              WRITE_CHAR('.');
0000098A  2              FOR INDEX := TEMP TO TEMP+I-2 DO
000009A6  2                 WRITE_CHAR(CHR(DIGITS[INDEX]+ORD('0')));
000009DC  2              WRITE_CHAR(EXP);
000009EA  2  #IF M68000
000009EA  2  #ELSE
000009EA  2              RSTACKSIZE := 50;
000009EA  2  #ENDIF
000009EA  2              WRITE_INT(DECEXP)
000009F8  2        END ;
000009F8  2     END ;
000009F8  2  END;
00000000  1  .

End of compilation, number of errors=    0
```

```
                 "68000"
                 ***********************************************************************************
                 ***********  STACK ****************************************************************
                 ***********************************************************************************
                               GLOBAL STACK_
                               ORG 1000H
001000 FFFF FFFF               DC.L -1          -1 ==> DO NOT FORK WHEN LOADED
                               PROG
000000                         DS.L  3FFH       STACK AREA
000FFC           STACK_        DS.L  1          INITIAL TOP OF STACK

Errors=    0
                 "68000"
                 ***********************************************************************************
                 ***********  UTILITIES ************************************************************
                 ***********************************************************************************
         <0000>  SOURCE        EQU  •  A0             ADDRESS OF SOURCE BYTE
         <0000>  SOURCE_OFFSET EQU     D0             BYTE OFFSET TO BE ADDED TO SOURCE (IF ANY)
         <0001>  DEST          EQU     A1             ADDRESS OF DEST   BYTE
         <0001>  DEST_OFFSET   EQU     D1             BYTE OFFSET TO BE ADDED TO DEST   (IF ANY)
         <0002>  LEN           EQU     A2             ADDRESS OF LEN RETURN PARAMATER   (FMTSYM ONLY)
         <0004>  COUNT         EQU     D4             BYTE COUNTER
         <0004>  CHAR          EQU     D4             CHAR TO BE MOVED
         <0002>  FIRSTBYT      EQU     D2             CHAR TO BE MOVED



                 ************************************************************************
                 * PROCEDURE FMTSYMBOL(SOURCE,DEST:PTR; DEST_OFFSET; VAR LEN:INT);        *
                 ************************************************************************
                 * Format standard PISCES symbol.                                         *
                 ************************************************************************
                 * INPUTS:                                                                *
                 * SOURCE       Pointer to standard PISCES symbol (on word boundry)       *
                 * DEST         Pointer to destination byte (on word boundry)             *
                 * DEST_OFFSET Byte offset to be added to dest (if any)                   *
                 ************************************************************************
                 * OUTPUTS:                                                               *
                 * LEN          # of characters formatted.                                *
                 ************************************************************************
                           GLOBAL FMTSYMBOL
000000 4244      FMTSYMBOL CLR    COUNT
000002 246F 0004           MOVE.L  4[A7],LEN        GET ADDRESS OF LEN FROM STACK
000006 322F 0008           MOVE.W  8[A7],DEST_OFFSET GET OFFSET TO BE ADDED TO DEST
00000A 226F 000A           MOVE.L 10[A7],DEST       GET ADDRESS OF DEST FROM STACK
00000E 206F 000E           MOVE.L 14[A7],SOURCE     GET ADDRESS OF SOURCE FROM STACK
000012 48C1                EXT.L  DEST_OFFSET       CONVERT WORD TO LONG
000014 D3C1                ADD.L  DEST_OFFSET,DEST  COMPUTE BYTE ADDRESS FOR DESTINATION

000016 1818                MOVE.B [SOURCE]+,COUNT   LOOK AT THE FIRST BYTE
000018 E84C                LSR.W  #4,COUNT          GET CHAR COUNT
00001A 0644 0001           ADD.W  #1,COUNT          GET CHAR COUNT
00001E 3484                MOVE.W COUNT,[LEN]       SAVE THE CHAR COUNT IN LEN
000020 0444 0001           SUB.W  #1,COUNT          INITIALIZE FOR DFB LOOP
000024 12D8      LOOP      MOVE.B [SOURCE]+,[DEST]+ MOVE A CHARACTER
000026 51CC FFFC           DBF    COUNT,LOOP        LOOP IF MORE CHARACTERS
00002A 91FC                SUB.L  #1,SOURCE         BACK UP TO LAST SOURCE CHAR
000030 0C10 0020           CMP.B  #20H,[SOURCE]     WAS IT A BLNAK
000034 6600 0006           BNE    EXITO
000038 0452 0001           SUB.W  #1,[LEN]          IT WAS A BLANK, SUB 1 FROM LEN
00003C 4E75      EXITO     RTS
                 ************************************************************************
                 * PROCEDURE FMTFILE  (SOURCE,DEST:PTR; DEST_OFFSET; VAR LEN:INT);        *
                 ************************************************************************
                 * Format standard PISCES file with userid                                *
                 ************************************************************************
                 * INPUTS:                                                                *
                 * SOURCE       Pointer to standard PISCES symbol (on word boundry)       *
                 * DEST         Pointer to destination byte (on word boundry)             *
                 * DEST_OFFSET Byte offset to be added to dest (if any)                   *
                 ************************************************************************
                 * OUTPUTS:                                                               *
                 * LEN          # of characters formatted.                                *
                 ************************************************************************
                           GLOBAL FMTFILE
```

```
00003E 246F 0004   FMTFILE  MOVE.L  4(A7),LEN          GET ADDRESS OF LEN FROM STACK
000042 322F 0008            MOVE.W  8(A7),DEST_OFFSET  GET OFFSET TO BE ADDED TO DEST
000046 226F 000A            MOVE.L  10(A7),DEST        GET ADDRESS OF DEST FROM STACK
00004A 206F 000E            MOVE.L  14(A7),SOURCE      GET ADDRESS OF SOURCE FROM STACK
00004E 48C1                 EXT.L   DEST_OFFSET        CONVERT WORD TO LONG
000050 D3C1                 ADD.L   DEST_OFFSET,DEST   COMPUTE BYTE ADDRESS FOR DESTINATION
000052 1418                 MOVE.B  (SOURCE)+,FIRSTBYT SAVE THE FIRST BYTE

000054 1802                 MOVE.B  FIRSTBYT,COUNT     LOOK AT THE FIRST BYTE
000056 EA0C                 LSR.B   #5,COUNT           GET CHAR COUNT(FILENAME)
000058 E30C                 LSL.B   #1,COUNT           GET CHAR COUNT(FILENAME)
00005A 0604 0001            ADD.B   #1,COUNT           GET CHAR COUNT(FILENAME)
00005E 4884                 EXT.W   COUNT
000060 3484                 MOVE.W  COUNT,(LEN)        SAVE THE CHAR COUNT IN LEN
000062 0444 0001            SUB.W   #1,COUNT           INTIALIZE FOR DFB LOOP
000066 12D8        FILELOOP MOVE.B  (SOURCE)+,(DEST)+  MOVE A CHARACTER
000068 51CC FFFC            DBF     COUNT,FILELOOP     LOOP IF MORE CHARACTERS
00006C 91FC                 SUB.L   #1,SOURCE          BACK UP TO LAST SOURCE CHAR
000072 0C18 0020            CMP.B   #20H,(SOURCE)+     WAS IT A BLNAK
000076 6600 000C            BNE     USERID             IT WAS NOT A BLANK
00007A 93FC                 SUB.L   #1,DEST            IT WAS A BLANK, BACKUP DEST POINTER
000080 0452 0001            SUB.W   #1,(LEN)           AND SUB 1 FROM LEN

000084 1802        USERID   MOVE.B  FIRSTBYT,COUNT     LOOK AT THE FIRST BYTE AGAIN
000086 E70C                 LSL.B   #3,COUNT           GET CHAR COUNT(USERID)
000088 EA0C                 LSR.B   #5,COUNT           GET CHAR COUNT(USERID)
00008A 4A04                 TST.B   COUNT              IS CHAR COUNT ZERO
00008C 6700 002A            BEQ     EXIT1              IF SO THEN EXIT
000090 4884                 EXT.W   COUNT
000092 D952                 ADD.W   COUNT,(LEN)        ADD THE CHAR COUNT TO LEN
000094 12FC 003A            MOVE.B  #":",(DEST)+       MOVE THE ":"
000098 0652 0001            ADD.W   #1,(LEN)           INC LEN FOR ":"
00009C 0444 0001            SUB.W   #1,COUNT           INTIALIZE FOR DFB LOOP
0000A0 12D8        IDLOOP   MOVE.B  (SOURCE)+,(DEST)+  MOVE A CHARACTER
0000A2 51CC FFFC            DBF     COUNT,IDLOOP       LOOP IF MORE CHARACTERS
0000A6 91FC                 SUB.L   #1,SOURCE          BACK UP TO LAST SOURCE CHAR
0000AC 0C10 0020            CMP.B   #20H,(SOURCE)      WAS IT A BLNAK
0000B0 6600 0006            BNE     EXIT1
0000B4 0452 0001            SUB.W   #1,(LEN)           IT WAS A BLANK, SUB 1 FROM LEN
0000B8 4E75        EXIT1    RTS
                   ***************************************************************************
                   * PROCEDURE MOVEBYTES(SOURCE:PTR; SOURCE_OFFSET:INT; DEST:PTR;            *
                   *                     DEST_OFFSET,COUNT:INT);                             *
                   ***************************************************************************
                   *INPUTS:                                                                  *
                   *SOURCE        Pointer to source byte (on word boundry)                   *
                   *SOURCE_OFFSET Byte offset to be added to source (if any)                 *
                   *DEST          Pointer to destination byte (on word boundry)              *
                   *DEST_OFFSET   Byte offset to be added to dest (if any)                   *
                   *COUNT         # of bytes to move. If COUNT<0 then COUNT:=0               *
                   ***************************************************************************
                            GLOBAL MOVEBYTES
0000BA 382F 0004   MOVEBYTES MOVE.W  4(A7),COUNT
0000BE 322F 0006            MOVE.W  6(A7),DEST_OFFSET
0000C2 226F 0008            MOVE.L  8(A7),DEST
0000C6 302F 000C            MOVE.W  12(A7),SOURCE_OFFSET
0000CA 206F 000E            MOVE.L  14(A7),SOURCE
0000CE 48C1                 EXT.L   DEST_OFFSET
0000D0 48C0                 EXT.L   SOURCE_OFFSET
0000D2 D1C0                 ADD.L   SOURCE_OFFSET,SOURCE
0000D4 D3C1                 ADD.L   DEST_OFFSET,DEST
0000D6 4A44                 TST.W   COUNT                TEST COUNT
0000D8 6F00 000E            BLE     EXIT2                IF COUNT <= 0 THEN EXIT
0000DC 0484                 SUB.L   #1,COUNT
0000E2 12D8        BYTELOOP2 MOVE.B (SOURCE)+,(DEST)+
0000E4 51CC FFFC            DBRA    COUNT,BYTELOOP2
0000E8 4E75        EXIT2    RTS
                   ***************************************************************************
                   * PROCEDURE PUTCHAR (DEST:PTR; DEST_OFFSET:INT; VAR CHARACTER:CHAR);      *
                   ***************************************************************************
                   *INPUTS:                                                                  *
                   *DEST         Pointer to destination  (on word boundry)                   *
                   *DEST_OFFSET  Byte offset to be added to destination (if any)             *
                   *CHARACTER    Character to be written.                                    *
                   ***************************************************************************
```

```
                          GLOBAL  PUTCHAR
0000EA 182F 0004  PUTCHAR MOVE.B  4(A7),CHAR
0000EE 322F 0006          MOVE.W  6(A7),DEST_OFFSET
0000F2 226F 0008          MOVE.L  8(A7),DEST
0000F6 48C1               EXT.L   DEST_OFFSET
0000F8 D3C1               ADD.L   DEST_OFFSET,DEST
0000FA 1284               MOVE.B  CHAR,(DEST)
0000FC 4E75               RTS


                  *****************************************************************
                  * PROCEDURE GETCHAR (SOURCE:PTR; SOURCE_OFFSET:INT; VAR CHARACTER:CHAR)*
                  *****************************************************************
                  *INPUTS:                                                        *
                  *SOURCE         Pointer to source  (on word boundry)            *
                  *SOURCE_OFFSET Byte offset to be added to source (if any)       *
                  *CHARACTER      Result                                          *
                  *****************************************************************
                          GLOBAL  GETCHAR
0000FE 226F 0004  GETCHAR MOVE.L  4(A7),DEST          ADDRESS FOR RESULT CHARACTER
000102 302F 0008          MOVE.W  8(A7),SOURCE_OFFSET
000106 206F 000A          MOVE.L 10(A7),SOURCE
00010A 48C0               EXT.L   SOURCE_OFFSET
00010C D1C0               ADD.L   SOURCE_OFFSET,SOURCE
00010E 1290               MOVE.B  (SOURCE),(DEST)
000110 4E75               RTS
                          END

Errors=    0
00000000  1  "68000" PREPROCESS
00000000  1  #DEFINE M68000 TRUE
00000000  1  (*****************************************************************************)
00000000  1  (*********** GETSOURCE1 (SCAN) **********************************************)
00000000  1  (*****************************************************************************)
00000000  1  PROGRAM PSOURCE1;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1  $FAR$
00000000  1  VAR
00000000  1  $EXTVAR ON$
00000000  1  ENVIRONMENT       :ENVIRONMENT_PTR;
00000000  1  ZERO              :INTEGER;
00000000  1  ONE               :INTEGER;
00000000  1  $EXTVAR OFF$
00000000  1  (***************************************************************)
00000000  1  (*********** STATICS *******************************************)
00000000  1  (***************************************************************)
00000000  1  BUFFER            :FMGRBUFF_PTR;
00000000  1
00000000  1  (***************************************************************)
00000000  1  (*********** PROCEDURES ****************************************)
00000000  1  (***************************************************************)
00000000  1  PROCEDURE NO_SOURCELINE      (VAR S:STRNG; PC:INTEGER); EXTERNAL;
00000000  1  PROCEDURE GETFILE            (REQ_PC:INTEGER; VAR PATH:PATH_TYPE; VAR FILE_NO:INT;
00000000  2                               VAR S:STRNG; VAR CURR_FILE_MAX:INTEGER; VAR LANGUAGE,ERROR:INT); EXTERNAL;
00000000  1  PROCEDURE SUBTRACT32         (OP1,OP2:INTEGER; VAR RESULT:INTEGER);EXTERNAL;
00000000  1  PROCEDURE LN_FETCHER         (SOURCE_NO,LANGUAGE,EMUL_ID:INT;  SYMBOL:PTR;  PC:INTEGER;
00000000  2                               DEST:PTR;  VAR LINENO,SIZE,ERROR:INT);EXTERNAL;
00000004  1
00000004  1
00000004  1
00000004  1
00000004  1  $GLOBPROC ON$
00000000  1  (***************************************************************)
00000000  1  (*********** INITGETSOURCE1 ************************************)
00000000  1  (***************************************************************)
00000000  1  (* Clear all information about the current source line.  This        *)
00000000  1  (* procedure must be called before the first call to GETSOURCE_NOSCAN  *)
00000000  1  (***************************************************************)
00000000  1  PROCEDURE INITGETSOURCE1;
00000004  2  BEGIN
00000004  2  NEW(BUFFER); (*Buffer for holding source line from data base*)
00000016  2  END;
00000000  1  $PAGE$
```

```
00000000  1  (*************************************************************************)
00000000  1  (********** GETSOURCE1 ****************************************************)
00000000  1  (*************************************************************************)
00000000  1  (* INPUTS:                                                                *)
00000000  1  (* REQ_PC        Requested program counter                                *)
00000000  1  (*************************************************************************)
00000000  1  (* OUTPUTS:                                                               *)
00000000  1  (* LINE              Source line text with byte count in word 0.          *)
00000000  1  (* LINE_NO           >0 ==>  source line # of LINE, no error.             *)
00000000  1  (*                   -2 ==>  "Program execution outside of absolute ..."*)
00000000  1  (*                   -1 ==>  "File not found, file= xxx:comp_db ..."      *)
00000000  1  (*                    0 ==>  "No source line found ..."                   *)
00000000  1  (* PATH              Path information for source line text.               *)
00000000  1  (* ERROR             For catastrophic fatal errors, ERROR will be non 0.*)
00000000  1  (*                   For minor errors, ERROR will be cleared to 0 and     *)
00000000  1  (*                   LINE_NO & LINE will reflect the minor error.         *)
00000000  1  (*************************************************************************)
00000000  1  PROCEDURE GETSOURCE1  (REQ_PC:INTEGER; REQ_SYM:PTR; VAR LINE:STRNG;
00000000  2                         VAR LINE_NO:INT; VAR PATH:PATH_TYPE; VAR ERROR:INT);
00000000  2  LABEL 1;
00000000  2  VAR
00000000  2  FILE_NO        :INT;     (*Source file # returned by GETFILE*)
00000002  2  LANGUAGE       :INT;     (*Language  returned by GETFILE*)
00000004  2  FILE_MAX       :INTEGER; (*Physical address of end of file found by GETFILE (dummy, not used in SOURCE1) *)
0000001E  2
0000001E  2  BEGIN
0000001E  2  GETFILE(REQ_PC,PATH,FILE_NO,STRNG(LINE),FILE_MAX,LANGUAGE,ERROR);
0000004C  2  IF ERROR<>0 THEN
00000056  2    BEGIN  (*GETFILE error*)
00000056  2    IF ERROR=NOT_FOUND THEN
00000064  2      BEGIN
00000064  2      LINE_NO:=-1;
0000006C  2      ERROR:=0;
00000072  2      END;
00000072  2    IF ERROR=DB_NOT_FOUND THEN
00000080  2      BEGIN
00000080  2      LINE_NO:=-2;
00000088  2      ERROR:=0;
0000008E  2      END;
0000008E  2    GOTO 1;
00000092  2    END;  (*GETFILE error*)
00000092  2  LN_FETCHER(FILE_NO,LANGUAGE,ENVIRONMENT^.EMUL_ID,REQ_SYM,REQ_PC,PTR(ADDR(BUFFER^[1])), LINE_NO, BUFFER^[0], ERROR);
000000D0  2  IF ERROR=NO_SYM THEN ERROR:=0;
000000E4  2  IF ERROR<>0 THEN
000000EE  2    BEGIN
000000EE  2    IF ERROR=NOT_FOUND THEN
000000FC  2      BEGIN (*Error: source line not found*)
000000FC  2      NO_SOURCELINE(LINE,REQ_PC); (*Format an error message in source line*)
0000010E  2      LINE_NO:= 0;
00000114  2      ERROR:=0;
0000011A  2      END;  (*Error: source line not found*)
0000011A  2    GOTO 1;
0000011E  2    END;   (*The PC is in the absolute and there is a comp_db file*)
0000011E  2  $WARN OFF$
0000011E  2  LINE:=STRNG(BUFFER^);
0000012E  2  1:END;.

End of compilation, number of errors=    0

00000000  1  "68000" PREPROCESS
00000000  1  #DEFINE M68000 TRUE
00000000  1  (***********************************************************************************)
00000000  1  (**********  GETSOURCE2 (NO SCAN) **************************************************)
00000000  1  (***********************************************************************************)
00000000  1  PROGRAM PSOURCE2;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1  $FAR$
00000000  1  VAR
00000000  1  $EXTVAR ON$
00000000  1  ENVIRONMENT        :ENVIRONMENT_PTR;
00000000  1  ZERO               :INTEGER;
00000000  1  ONE                :INTEGER;
```

```
00000000 1 $EXTVAR OFF$
00000000 1 (*************************************************************************)
00000000 1 (********** STATICS ******************************************************)
00000000 1 (*************************************************************************)
00000000 1 BUFFER            :FMGRBUFF_PTR;
00000000 1
00000000 1 (*************************************************************************)
00000000 1 (********** PROCEDURES ***************************************************)
00000000 1 (*************************************************************************)
00000000 1 PROCEDURE NO_SOURCELINE    (VAR S:STRNG; PC:INTEGER); EXTERNAL;
00000000 1 PROCEDURE GETFILE          (REQ_PC:INTEGER; VAR PATH:PATH_TYPE; VAR FILE_NO:INT;
00000000 2                            VAR S:STRNG; VAR CURR_FILE_MAX:INTEGER; VAR LANGUAGE,ERROR:INT); EXTERNAL;
00000000 1 PROCEDURE SUBTRACT32       (OP1,OP2:INTEGER; VAR RESULT:INTEGER);EXTERNAL;
00000000 1 PROCEDURE LN_HANDLER       (SOURCE_NO:INT;  PC:INTEGER; FIRST:BOOLEAN; VAR LINESTART_PC,LINENEXT_PC:INTEGER;
00000000 2                            VAR LINENO,ERROR:INT);EXTERNAL;
00000000 1 PROCEDURE SCLN_FETCH       (SOURCE_NO:INT;  LINENO:INT;
00000000 2                            DEST:PTR;  VAR SIZE,ERROR:INT);EXTERNAL;
00000000 1 FUNCTION  GT               (OP1,OP2:INTEGER):BOOLEAN; EXTERNAL;
00000000 1 FUNCTION  LT               (OP1,OP2:INTEGER):BOOLEAN; EXTERNAL;
00000000 1
00000000 1
00000000 1
00000000 1
00000000 1 $GLOBPROC ON$
00000000 1 (*************************************************************************)
00000000 1 (********** INITGETSOURCE2 ***********************************************)
00000000 1 (*************************************************************************)
00000000 1 (* Clear all information about the current source line.  This            *)
00000000 1 (* procedure must be called before the first call to GETSOURCE_NOSCAN    *)
00000000 1 (*************************************************************************)
00000000 1 PROCEDURE INITGETSOURCE2;
00000004 2 BEGIN
00000004 2 NEW (BUFFER); (*Buffer for holding source line from data base*)
00000016 2 END;
00000000 1 $PAGE$
00000000 1 (*************************************************************************)
00000000 1 (********** GETSOURCE2 ***************************************************)
00000000 1 (*************************************************************************)
00000000 1 (* INPUTS:                                                               *)
00000000 1 (* REQ_PC        Requested program counter                               *)
00000000 1 (*************************************************************************)
00000000 1 (* OUTPUTS:                                                              *)
00000000 1 (* LINE             Source line text (or error message).                 *)
00000000 1 (* LINE_NO          >0 ==>  source line # of LINE, no error.             *)
00000000 1 (*                  -2 ==>  "Program execution outside of absolute ..."  *)
00000000 1 (*                  -1 ==>  "File not found, file= xxx:comp_db ..."      *)
00000000 1 (*                   0 ==>  "No source line found ..."                   *)
00000000 1 (* PATH             Path information for source line.                    *)
00000000 1 (* ERROR            For catastrophic fatal errors, ERROR will be non 0.  *)
00000000 1 (*                  For minor errors, ERROR will be cleared to 0 and     *)
00000000 1 (*                  LINE_NO & LINE will reflect the error.               *)
00000000 1 (* MIN              Min PC for current LINE iff LINE_NO >0.              *)
00000000 1 (* MAX              Max PC for current LINE iff LINE_NO >0.              *)
00000000 1 (*************************************************************************)
00000000 1 PROCEDURE GETSOURCE2 (REQ_PC:INTEGER; VAR LINE:STRNG; VAR LINE_NO:INT;
00000000 2                      VAR PATH:PATH_TYPE; VAR MIN,MAX:INTEGER; VAR ERROR:INT);
00000000 2 LABEL 1;
00000000 2 VAR
00000000 2 FILE_NO       :INT;     (*Source file # returned by GETFILE*)
00000002 2 LANGUAGE      :INT;     (*Language  returned by GETFILE*)
00000004 2 FILE_MAX      :INTEGER; (*Physical address of end of file found by GETFILE *)
0000001E 2 BEGIN
0000001E 2 GETFILE(REQ_PC,PATH,FILE_NO,STRNG(LINE),FILE_MAX,LANGUAGE,ERROR);  (*Puts error string in LINE iff ERROR<>0*)
0000004C 2 IF ERROR<>0 THEN
00000056 2   BEGIN  (*GETFILE error*)
00000056 2   IF ERROR=NOT_FOUND THEN
00000064 2     BEGIN
00000064 2     LINE_NO:=-1;
0000006C 2     ERROR:=0;
00000072 2     END;
00000072 2   IF ERROR=DB_NOT_FOUND THEN
00000080 2     BEGIN
00000080 2     LINE_NO:=-2;
00000088 2     ERROR:=0;
0000008E 2     END;
```

```
0000008E  2    GOTO 1;
00000092  2    END;   (*GETFILE error*)
00000092  2  LN_HANDLER(FILE_NO,REQ_PC,FALSE,MIN,MAX,LINE_NO,ERROR);
000000C0  2  IF ERROR=0 THEN SCLN_FETCH(FILE_NO,LINE_NO,PTR(ADDR(BUFFER^[1])),BUFFER^[0],ERROR);
000000F2  2  IF ERROR<>0 THEN
000000FC  2    BEGIN  (*LN_HANDLER of SCLN_FETCH error*)
000000FC  2    IF ERROR=NOT_FOUND THEN
0000010A  2      BEGIN
0000010A  2      NO_SOURCELINE(LINE,REQ_PC); (*Format an error message in source line*)
0000011C  2      LINE_NO:=0;
00000122  2      ERROR:=0;
00000128  2      END;
00000128  2    GOTO 1;
0000012C  2    END;   (*LN_HANDLER of SCLN_FETCH error*)
0000012C  2  IF (MAX[0]=0) AND (MAX[1]=0)
00000148  2    THEN MAX:=FILE_MAX                  (*Current line ends with end of file*)
00000154  2    ELSE SUBTRACT32(MAX,ONE,MAX); (*Subtract one to get ending pc of current line*)
00000172  2  $WARN OFF$
00000172  2  LINE:=STRNG(BUFFER^);
00000182  2  1:END;.

End of compilation, number of errors=    0

00000000  1  "68000" PREPROCESS
00000000  1  #DEFINE M68000 TRUE
00000000  1  (*******************************************************************************************)
00000000  1  (********** SOURCEU (UTILITIES) ***********************************************************)
00000000  1  (*******************************************************************************************)
00000000  1  PROGRAM PSOURCEU;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"
00000000  1  $FAR$
00000000  1  VAR
00000000  1  $EXTVAR ON$
00000000  1  ENVIRONMENT        :ENVIRONMENT_PTR;
00000000  1  ZERO               :INTEGER;
00000000  1  ONE                :INTEGER;
00000000  1  $EXTVAR OFF$
00000000  1
00000000  1  (**************************************************************************)
00000000  1  (********** STATICS *******************************************************)
00000000  1  (**************************************************************************)
00000000  1  CURR_FILE_NO       :INT;
00000002  1  CURR_FILE_MIN      :INTEGER;  (*Physical address of start of source file*)
00000006  1  CURR_FILE_MAX      :INTEGER;  (*Physical address of end   of source file*)
0000000A  1  CURR_LANGUAGE      :INT;      (*Language for    current source file*)
0000000C  1  CURR_PATH          :PATH_TYPE;
00000000  1
00000000  1  (**************************************************************************)
00000000  1  (********** PROCEDURES ****************************************************)
00000000  1  (**************************************************************************)
00000000  1  PROCEDURE SUBTRACT32        (OP1,OP2:INTEGER; VAR RESULT:INTEGER);EXTERNAL;
00000000  1  PROCEDURE PUTCHAR           (DEST:PTR;   DEST_OFFSET:INT;   CHARACTER:CHAR); EXTERNAL;
00000000  1  PROCEDURE MOVEBYTES         (SOURCE:PTR; SOURCE_OFFSET:INT; DEST:PTR; DEST_OFFSET:INT; COUNT:INT); EXTERNAL;
00000000  1  PROCEDURE FMTFILE           (SOURCE,DEST:PTR; DEST_OFFSET:INT; VAR LEN:INT);EXTERNAL;
00000000  1  PROCEDURE WHICH_FILE        (ABS_FILE:PTR; ABS_DISC:INT; VAR DATA_ADDR:INTEGER; VAR FILE_START_PC,FILE_END_PC:INTEGER;
00000000  2                              SOURCE_NAME:PTR; VAR SOURCE_DISC,RELOCATION,ERROR:INT);EXTERNAL;
00000000  1  PROCEDURE PROG_INIT         (SOURCE_NAME:PTR; VAR SOURCE_DISC:INT;
00000000  2                              VAR SOURCE_NO,PROCESSOR,LANGUAGE,ERROR:INT); EXTERNAL;
00000000  1  PROCEDURE FORMAT            (SIGN_FLAG:INT;SOURCE:PTR; SOURCESIZE:INT;
00000000  2                              DEST:PTR; DEST_OFFSET:INT; VAR DESTSIZE:INT; BASE:INT; JUSTIFY:INT); EXTERNAL;
00000000  1  FUNCTION  GE                (OP1,OP2:INTEGER):BOOLEAN; EXTERNAL;
00000000  1  FUNCTION  LE                (OP1,OP2:INTEGER):BOOLEAN; EXTERNAL;
00000000  1  FUNCTION  GT                (OP1,OP2:INTEGER):BOOLEAN; EXTERNAL;
00000000  1  FUNCTION  LT                (OP1,OP2:INTEGER):BOOLEAN; EXTERNAL;
00000000  1  $PAGE$
00000000  1  $GLOBPROC ON$
00000000  1  (**************************************************************************)
00000000  1  (********** FMT_PC ********************************************************)
00000000  1  (**************************************************************************)
00000000  1  (* For formatting error messanges.                                       *)
00000000  1  (**************************************************************************)
```

```
00000000 1 (* INPUTS:                                                          *)
00000000 1 (* PC           Program counter to be formatted                     *)
00000000 1 (* S            String to which "(PC=xxxxH)" will be appended.      *)
00000000 1 (*******************************************************************)
00000000 1 (* OUTPUTS:                                                         *)
00000000 1 (* S            String with appended "(PC=xxxxH)".                  *)
00000000 1 (*******************************************************************)
00000000 1 PROCEDURE FMT_PC(PC:INTEGER;VAR S:STRNG);
00000000 2 VAR
00000000 2 N              :INT;  (*No of characters formatted*)
00000002 2 $EXTVAR ON$
00000002 2 E009:STRNG;  (*" (PC="*)
00000002 2 $EXTVAR OFF$
00000004 2 BEGIN
00000004 2 MOVEBYTES(PTR(ADDR(E009)), 2, PTR(ADDR(S.ASCII)), S.LEN, E009.LEN);
00000032 2 S.LEN:=S.LEN + E009.LEN;   (*Update len to reflect addition of E005*)
0000003E 2 N:=10;
00000044 2 FORMAT(UNSIGNED,PTR(ADDR(PC)),4,PTR(ADDR(S.ASCII)),S.LEN,N,16,LEFT);
00000078 2 S.LEN:=S.LEN+N;
00000082 2 PUTCHAR(PTR(ADDR(S.ASCII)),S.LEN,")");
0000009E 2 S.LEN:=S.LEN+1;
000000A8 2 END;
00000000 1 $PAGE$
00000000 1 $GLOBPROC ON$
00000000 1 (*******************************************************************)
00000000 1 (********** FMT_FILENOTFOUND ****************************************)
00000000 1 (*******************************************************************)
00000000 1 (* For formatting error messages.                                   *)
00000000 1 (*******************************************************************)
00000000 1 (* INPUTS:                                                          *)
00000000 1 (* FILENAME     Comp_db file name to be formatted.                  *)
00000000 1 (* DISC         Disc # for Comp_db.                                 *)
00000000 1 (* S            String to which "File not found..." will be appended *)
00000000 1 (*******************************************************************)
00000000 1 (* OUTPUTS:                                                         *)
00000000 1 (* S            String with appended "File not found...".           *)
00000000 1 (*******************************************************************)
00000000 1 PROCEDURE FMT_FILENOTFOUND(VAR FILENAME:FNGRNAME; DISC:INT; VAR S:STRNG);
00000000 2 VAR
00000000 2 N           :INT;  (*No of characters formatted*)
00000002 2 $EXTVAR ON$
00000002 2 E004:STRNG;  (* "File not found, file=" *)
00000002 2 E005:STRNG;  (* ":comp_db" *)
00000002 2 $EXTVAR OFF$
00000002 2 CHARCOUNT:INT; (*# of characters to format for disc # *)
000000B0 2 BEGIN WITH S DO BEGIN
000000B8 2 MOVEBYTES(PTR(ADDR(E004.ASCII)), 0, PTR(ADDR(ASCII)),LEN, E004.LEN);  (*"File not found, file=" *)
000000DC 2 LEN:=LEN+E004.LEN;                                            (*Update LEN*)
000000E8 2 FMTFILE(PTR(ADDR(FILENAME)),PTR(ADDR(ASCII)),LEN,N);          (*Fmt file name*)
0000010A 2 LEN:=LEN+N;                                                   (*Update LEN*)
00000114 2 IF DISC<>0 THEN
0000011C 2   BEGIN (*Format disc #*)
0000011C 2   PUTCHAR(PTR(ADDR(ASCII)),LEN,":");                           (*":"*)
00000134 2   LEN:=LEN+1;
0000013A 2   CHARCOUNT:=1;                                                (*Fmt disc #*)
00000140 2   FORMAT(UNSIGNED,PTR(ADDR(DISC)),2,PTR(ADDR(ASCII)),LEN,CHARCOUNT,10,RIGHT);  (*Fmt disc #*)
00000172 2   LEN:=LEN+1;                                                  (*Update LEN*)
00000178 2   END;  (*Format disc #*)
00000178 2 MOVEBYTES(PTR(ADDR(E005.ASCII)), 0, PTR(ADDR(ASCII)),LEN, E005.LEN);  (*"comp_db" *)
000001A0 2 LEN:=LEN+E005.LEN;                                            (*Update LEN*)
000001AC 2 END; END; (*END WITH*) (*END PROCEDURE*)
00000000 1 $PAGE$
00000000 1 $GLOBPROC ON$
00000000 1 (*******************************************************************)
00000000 1 (********** NO_SOURCELINE *******************************************)
00000000 1 (*******************************************************************)
00000000 1 (* INPUTS:                                                          *)
00000000 1 (* S             Dest string for error message                      *)
00000000 1 (*******************************************************************)
00000000 1 (* OUTPUTS:                                                         *)
00000000 1 (* S             Dest string for error message                      *)
00000000 1 (*******************************************************************)
00000000 1 PROCEDURE NO_SOURCELINE(VAR S:STRNG; PC:INTEGER);
00000000 2 VAR
00000000 2 $EXTVAR ON$
00000000 2 E002          :STRNG, (*"Program execution outside of absolute file"*)
```

```
00000000 2 $EXTVAR OFF$
000001B4 2 BEGIN (* "No source line found (PC=nnnn)" *)
000001B4 2 MOVEBYTES(PTR(ADDR(E002)), 0, PTR(ADDR(S)), 0, E002.LEN+2);
000001DC 2 FMT_PC(PC,S);
000001EE 2 END;  (* "No source line found (PC=nnnn)" *)
00000000 1
00000000 1
00000000 1
00000000 1 (*************************************************************************)
00000000 1 (********** INIT_GETFILE ************************************************)
00000000 1 (*************************************************************************)
00000000 1 (* Initialize the static variables that are used to remember where      *)
00000000 1 (* I'm at to so I can avoid calls to data base source line routines.    *)
00000000 1 (*************************************************************************)
00000000 1 $GLOBPROC ON$
00000000 1 PROCEDURE INIT_GETFILE;
000001F6 2 BEGIN
000001F6 2 CURR_FILE_MIN               :=ONE;
000001FE 2 CURR_FILE_MAX               :=ZERO;
00000206 2 CURR_PATH.SOURCEFILE_NAME[0] :=0; (*Init to no path info.  If WHICHFILE succeds it will write over the 0*)
0000020A 2 CURR_PATH.PROC_NAME[0]       :=0; (*PROC is never used for sourceline paths*)
0000020E 2 END;
00000000 1 $PAGE$
00000000 1 $GLOBPROC ON$
00000000 1 (*************************************************************************)
00000000 1 (*********** GETFILE *****************************************************)
00000000 1 (*************************************************************************)
00000000 1 (* INPUTS:                                                               *)
00000000 1 (* REQ_PC          Requested program counter                             *)
00000000 1 (* (STATICS)                                                             *)
00000000 1 (* CURR_FILE_NO    Program number for data base for curr source file     *)
00000000 1 (* CURR_PATH       Path information for CURR_FILE_NO.                    *)
00000000 1 (* CURR_FILE_MIN   Starting PC for CURR_FILE_NO.                         *)
00000000 1 (* CURR_FILE_MAX   Ending   PC for CURR_FILE_NO.                         *)
00000000 1 (* ENVIRONMENT     Ptr to environment for current measurnet.             *)
00000000 1 (*************************************************************************)
00000000 1 (* OUTPUTS:                                                              *)
00000000 1 (* FILE_NO         Program number from PROG_INIT iff ERROR=0             *)
00000000 1 (* PATH            Path information for REQ_PC.                          *)
00000000 1 (* S               Formatted error message iff ERROR<>0.                 *)
00000000 1 (* FILE_MAX        Max pc for current file.                              *)
00000000 1 (* LANGUAGE        Language for current file.                            *)
00000000 1 (* ERROR           0==> no error.                                        *)
00000000 1 (* (STATICS)                                                             *)
00000000 1 (* CURR_FILE_MIN   Static variable, current source file starting PC.     *)
00000000 1 (* CURR_FILE_MAX   Static variable, current source file ending PC.       *)
00000000 1 (* CURR_FILENO     Static variable, current source file number.          *)
00000000 1 (* CURR_LANGUAGE   Static variable, current source file language.        *)
00000000 1 (* CURR_PATH       Static variable, current source path information.     *)
00000000 1 (*************************************************************************)
00000000 1 PROCEDURE GETFILE  (REQ_PC:INTEGER; VAR PATH:PATH_TYPE; VAR FILE_NO:INT;
00000000 2                     VAR S:STRNG; VAR FILE_MAX:INTEGER; VAR LANGUAGE,ERROR:INT);
00000000 2 LABEL 1;
00000000 2 VAR
00000000 2 RELOC:INT;            (*Dummy relocation paramater for WHICH_FILE*)
00000002 2 $EXTVAR ON$
00000002 2 E000         :STRNG; (*"Program execution outside of absolute file"*)
00000002 2 $EXTVAR OFF$
00000216 2
00000216 2 BEGIN WITH ENVIRONMENT^ DO BEGIN
0000021E 2 IF GT(REQ_PC,CURR_FILE_MAX) OR LT(REQ_PC,CURR_FILE_MIN) THEN
0000024C 2   BEGIN (*REQ_PC not in CURR_FILE_NO*)
0000024C 2   WHICH_FILE(PTR(ADDR(ABSFILE_NAME)),ABSFILE_DISC,REQ_PC,CURR_FILE_MIN,CURR_FILE_MAX,
0000024C 2     PTR(ADDR(CURR_PATH.SOURCEFILE_NAME)),CURR_PATH.SOURCEFILE_DISC,RELOC,ERROR);
00000286 2   IF ERROR<>0 THEN    **
00000290 2     BEGIN (*WHICH_FILE error*)
00000290 2     IF ERROR=NOT_FOUND THEN
0000029E 2       BEGIN (* "Program execution outside of absolute file (PC=xxxx)" *)
0000029E 2       MOVEBYTES(PTR(ADDR(E000)), 0, PTR(ADDR(S)), 0, E000.LEN+2);
000002C6 2       FMT_PC(REQ_PC,STRNG(S));
000002D8 2       END;  (* "Program execution outside of absolute file (PC=xxxx)" *)
000002D8 2     GOTO 1;
000002DC 2     END;   (*WHICH_FILE error*)
000002DC 2   PROG_INIT(PTR(ADDR(CURR_PATH.SOURCEFILE_NAME)),CURR_PATH.SOURCEFILE_DISC,CURR_FILE_NO,PROCESSOR,CURR_LANGUAGE,ERRO
```

```
203 00000308  2    IF ERROR<>0 THEN
204 00000312  2      BEGIN (*PROG_INIT error*)
205 00000312  2      IF ERROR=DD_NOT_FOUND THEN
206 00000320  2        BEGIN (*PROG_INIT error*)
207 00000320  2        FMT_FILENOTFOUND(CURR_PATH.SOURCEFILE_NAME,CURR_PATH.SOURCEFILE_DISC,S);
208 0000033A  2        FMT_PC(REQ_PC,S);
209 0000034C  2        END;  (*PROG_INIT error*)
210 0000034C  2      GOTO 1;
211 00000350  2      END ; (*PROG_INIT error*)
212 00000350  2    END;  (*REQ_PC not in CURR_FILE_NO*)
213 00000350  2  1:
214 00000350  2  FILE_NO  :=CURR_FILE_NO;
215 00000358  2  FILE_MAX :=CURR_FILE_MAX;
216 00000360  2  LANGUAGE :=CURR_LANGUAGE;
217 00000368  2  PATH     :=CURR_PATH;
218 00000378  2  IF ERROR<>0 THEN INIT_GETFILE; (*ERROR==> flush all knowledge of current file*)
219 00000388  2  END:END;

End of compilation, number of errors=    0

 LOCATION OBJECT CODE LINE     SOURCE LINE

                       1 "68000"
                       2 ***************************************************************************
                       3 ********** STATUS LINES: ***************************************************
                       4 ***************************************************************************
                       5         GLOBAL S000
  000000 0002          6 S000    DC.W 2
  000002 2020          7         ASC "  "
                       8         EVEN
                       9
                      10         GLOBAL S001
  000004 0012         11 S001    DC.W 18
  000006 466F726D61   12         ASC "Formatting display"
                      13         EVEN
                      14
                      15         GLOBAL S002
  000018 0008         16 S002    DC.W 8
  00001A 436F707969   17         ASC "Copying "
                      18         EVEN
                      19
                      20         GLOBAL S003
  000022 0014         21 S003    DC.W 20
  000024 466F726D61   22         ASC "Formatting next page"
                      23         EVEN
                      24
                      25         GLOBAL S004
  000038 0018         26 S004    DC.W 24
  00003A 466F726D61   27         ASC "Formatting previous page"
                      28         EVEN
                      29
                      30         GLOBAL S005
  000052 0010         31 S005    DC.W 16
  000054 4177616974   32         ASC "Awaiting command"
                      33         EVEN
                      34
                      35         GLOBAL S006
  000064 000E         36 S006    DC.W 14
  000066 436F707920   37         ASC "Copy complete "
                      38         EVEN
                      39 ***************************************************************************
                      40 ********** HEADINGS ********************************************************
                      41 ***************************************************************************
                      42         GLOBAL H000
  000074 0006         43 H000    DC.W 6
  000076 53796D626F   44         ASC "Symbol"
                      45         EVEN
                      46
                      47         GLOBAL H001
  00007C 0005         48 H001    DC.W 5
  00007E 56616C7565   49         ASC "Value"
                      50         EVEN
                      51
                      52         GLOBAL H002
```

```
000084 0004          H002   DC.W 4
000086 53746174             ASC "Stat"
                            EVEN

                            GLOBAL H003
00008A 0009          H003   DC.W 9
00008C 2054696D65           ASC " Time-rel"
                            EVEN

                            GLOBAL H004
000096 0009          H004   DC.W 9
000098 2054696D65           ASC " Time-abs"
                            EVEN

                            GLOBAL H005
0000A2 0009          H005   DC.W 9
0000A4 436F756E74           ASC "Count-rel"
                            EVEN

                            GLOBAL H006
0000AE 0009          H006   DC.W 9
0000B0 436F756E74           ASC "Count-abs"
                            EVEN

                            GLOBAL H007
0000BA 0006          H007   DC.W 6
0000BC 536F757263           ASC "Source"
                            EVEN

                            GLOBAL H008
0000C2 000B          H008   DC.W 11
0000C4 536F757263           ASC "Source path"
                            EVEN

                            GLOBAL H009
0000D0 000B          H009   DC.W 11
0000D2 53796D626F           ASC "Symbol path"
                            EVEN

                            GLOBAL H010
0000DE 0024          H010   DC.W 36
0000E0 20204D696E           ASC "  Minimum   Maximum      Mean  Count"
                            EVEN
               ******************************************************************************
               ********** ERROR MESSAGES ****************************************************
               ******************************************************************************
                            GLOBAL E000
000104 002A          E000   DC.W 42
000106 50726F6772           ASC "Program execution outside of absolute file"
                            EVEN

                            GLOBAL E001
000130 0014          E001   DC.W 20
000132 4E6F206D6F           ASC "No module name found"
                            EVEN

                            GLOBAL E002
000146 0014          E002   DC.W 20
000148 4E6F20736F           ASC "No source line found"
                            EVEN

                            GLOBAL E003
00015C 0025          E003   DC.W 37
00015E 53796D626F           ASC "Symbol(s) type information is too big"             (FMTSYM, FMTVAL)
                            EVEN

                            GLOBAL E004
000184 0016          E004   DC.W 22
000186 46696C6520           ASC "File not found, file= "
                            EVEN

                            GLOBAL E005
00019C 0008          E005   DC.W   8
00019E 3A636F6D70           ASC ":comp_db"
                            EVEN
```

```
                           GLOBAL E006
0001A6 0009          E006  DC.W 09
0001A8 2D696E6669          ASC "-infinity"
                           EVEN
                           GLOBAL E007
0001B2 0009          E007  DC.W 09
0001B4 2B696E6669          ASC "+infinity"
                           EVEN
                           GLOBAL E008
0001BE 000C          E008  DC.W 12
0001C0 4E6F742061          ASC "Not a number"
                           EVEN
                           GLOBAL E009
0001CC 0006          E009  DC.W 06
0001CE 202850433D          ASC " (PC= "
                           EVEN
     *************************************************************************
     ********** SYSTEM ERROR MESSAGES (always fatal)**************************
     *************************************************************************
                           GLOBAL E100  (Used by FATAL_ERROR: fatal)
0001D4 0004          E100  DC.W 4
0001D6 45313030            ASC "E100"   (PROC_STAC error in TRACESTM)
                           EVEN
     *************************************************************************
     ********** STATUS FIELDS ************************************************
     *************************************************************************
                           GLOBAL F000
0001DA 0004          F000  DC.W 4
0001DC 72656164            ASC "read"
                           EVEN
                           GLOBAL F001
0001E0 0005          F001  DC.W 5
0001E2 7772697465          ASC "write"
                           EVEN
                           GLOBAL F002
0001E8 0005          F002  DC.W 5
0001EA 656E747279          ASC "entry"
                           EVEN
                           GLOBAL F003
0001F0 0004          F003  DC.W 4
0001F2 65786974            ASC "exit"
                           EVEN
                           GLOBAL F004
0001F6 0001          F004  DC.W 1
0001F8 20                  ASC " "
                           EVEN
     *************************************************************************
     ********** MISC *********************************************************
     *************************************************************************
                           GLOBAL M000
0001FA 001F          M000  DC.W 31
0001FC 427265616B          ASC "Break for new stack information"
                           EVEN
                           GLOBAL M001
00021C 0006          M001  DC.W 06
00021E 2020202020          ASC ^     "^
                           EVEN
                              GLOBAL printer_HP
000224 687072696E    printer_HP ASC "hprinterHP      "
                              EVEN

Errors=    0
```

```
00000000  1  "68000" PREPROCESS
00000000  1  #DEFINE M68000 TRUE
00000000  1  (********************************************************************************)
00000000  1  (**********  LOADMEMORY *********************************************************)
00000000  1  (********************************************************************************)
00000000  1  (* READ FILE "M" AND WRITE INTO SODA MEMORY                                     *)
00000000  1  (********************************************************************************)
00000000  1  PROGRAM PLOADMEMORY;
00000000  1  $EXTENSIONS ON$
00000000  1  $WIDTH 120$
00000000  1  $LIB_ABS_LONG$
00000000  1  $CALL_ABS_LONG+$
00000000  1  #INCLUDE "TYPES:KIP"        (*ALL TYPE DEFINITIONS*)
00000000  1  $PAGE$
00000000  1  TYPE
00000000  1  BUFFER_TYPE      =ARRAY[0..130] OF INT;
00000000  1  BUFFER_PTR       =^BUFFER_TYPE;
00000000  1
00000000  1  VAR
00000000  1  IBUFF            :BUFFER_PTR;(*POINTS TO M FMGR RECORD WITH RECORD NUMBER*)
00000004  1  M_DCB            :DCB_TYPE;
00000006  1  P_DCB            :DCB_TYPE;
00000008  1  M_NAME           :FMGRNAME;  (*FMGR FILE NAME FOR FOOTDC FILE*)
00000018  1  P_NAME           :FMGRNAME;  (*FMGR FILE NAME FOR FOOTDC FILE*)
00000028  1  ERROR            :INT;
0000002A  1  I                :INT;
00000000  1
00000000  1  PROCEDURE OUTIT           (LETTER:CHAR;VALUE:INT;BASE:CHAR); EXTERNAL;
00000000  1  PROCEDURE P_OPEN         (VAR NAME:FMGRNAME;FTYPE,DISC:INT; VAR DCB:DCB_TYPE;DCBSIZE:INT;VAR ERROR:INT);EXTERNAL;
00000000  1  PROCEDURE P_READ         (VAR DCB:DCB_TYPE; VAR IBUFF:INT; LENGTH:INT; VAR ERROR:INT);EXTERNAL;
00000000  1  PROCEDURE P_CLOSE        (DCB:DCB_TYPE);EXTERNAL;
00000000  1  PROCEDURE M_CREATE       (VAR NAME:FMGRNAME;FTYPE,DISC:INT; VAR DCB:DCB_TYPE;DCBSIZE:INT;VAR ERROR:INT);EXTERNAL;
00000000  1  PROCEDURE M_WRITE        (VAR DCB:DCB_TYPE; VAR IBUFF:INT; VAR ERROR:INT);EXTERNAL;
00000000  1  PROCEDURE M_CLOSE        (DCB:DCB_TYPE);EXTERNAL;
00000000  1  $PAGE$
00000000  1  $GLOBPROC ON$
00000000  1  (********************************************************************************)
00000000  1  (**********  LOADMEMORY *********************************************************)
00000000  1  (********************************************************************************)
00000000  1  (* READ FILE "M" AND WRITE INTO SODA MEMORY                                     *)
00000000  1  (********************************************************************************)
00000000  1  PROCEDURE LOADMEMORY;
00000000  2  LABEL 1;
00000004  2
00000004  2  BEGIN
00000004  2  NEW(IBUFF);
00000016  2  P_NAME[0]:=6046H; (* F*)
0000001C  2  P_NAME[1]:=4F4FH; (*OO*)
00000022  2  P_NAME[2]:=5444H; (*TD*)
00000028  2  P_NAME[3]:=4320H; (*C *)
0000002E  2  ERROR:=0;
00000032  2  P_OPEN(P_NAME,8,-1,P_DCB,4,ERROR);
00000056  2  IF ERROR<>0 THEN GOTO 1;
00000062  2  M_CREATE(M_NAME,8,-1,M_DCB,4,ERROR);
00000086  2  IF ERROR<>0 THEN GOTO 1;
00000092  2  FOR I:=1 TO 1024 DO
00000098  2    BEGIN
00000098  2    P_READ  (P_DCB,INT(IBUFF^[1]),128,ERROR);
000000B8  2    IF ERROR<>0 THEN GOTO 1;
000000C4  2    M_WRITE (M_DCB,INT(IBUFF^[1]),ERROR);
000000E0  2    IF ERROR<>0 THEN GOTO 1;
000000EC  2    END;
000000FC  2  {
000000FC  2  1:P_CLOSE(P_DCB);
000000FC  2  M_CLOSE(M_DCB);
000000FC  2  }
000000FC  2  1:
000000FC  2  IF ERROR<>0 THEN OUTIT("E",ERROR,"D");
00000118  2  END;.

End of compilation, number of errors=    0
```

| FILE/PROG NAME | PROGRAM | DATA | COMMON | ABSOLUTE | DATE | TIME | COMMENTS |
|---|---|---|---|---|---|---|---|
| ENTRY:KIP | 0058000 | | | | Fri, 25 Jan 1985, | 13:21 | |
| MAIN:KIP | 0058008 | 0002000 | | | Fri, 25 Jan 1985, | 13:24 | |
| PD:KIP | 005A540 | | | | Fri, 25 Jan 1985, | 13:30 | |
| KIPMIX:KIP | 005A6FC | 000203A | | | Fri, 25 Jan 1985, | 13:32 | |
| SCREEN:KIP | 005A818 | 000203C | | | Fri, 25 Jan 1985, | 13:33 | |
| TRACEVAR:KIP | 005AA7E | 0002040 | | | Fri, 25 Jan 1985, | 13:34 | |
| TRACEMOD:KIP | 005AFF0 | 0002044 | | | Fri, 25 Jan 1985, | 13:36 | |
| TRACEDAT:KIP | 005B632 | 000204E | | | Mon, 10 Dec 1984, | 14:00 | |
| TRACESTM:KIP | 005BBF2 | 0002052 | | | Fri, 25 Jan 1985, | 13:49 | |
| TRACEDONT:KIP | 005DBCE | 00020EE | | | Fri, 25 Jan 1985, | 13:56 | |
| TIMEMOD:KIP | 005DEEC | 00020F2 | | | Fri, 25 Jan 1985, | 13:57 | |
| COUNTSTM:KIP | 005E0B2 | 00020F6 | | | Fri, 25 Jan 1985, | 13:58 | |
| FOOTDC:KIP | 005E31C | 00020FC | | | Fri, 25 Jan 1985, | 14:01 | |
| FMTSYM:KIP | 005EF7A | | | | Fri, 25 Jan 1985, | 14:05 | |
| FMTVAL:KIP | 005FAB4 | | | | Fri, 25 Jan 1985, | 14:09 | |
| FMTKC9A:KIP | 0060BA4 | | | | Fri, 25 Jan 1985, | 14:12 | |
| FORMATER:KIP | 0060E90 | 0002106 | | | Fri, 25 Jan 1985, | 14:15 | |
| FMTREAL:KIP | 0061490 | 00021AC | | | Fri, 25 Jan 1985, | 14:17 | |
| STACK:KIP | 0061E8C | | | 0001000-0001003 | Fri, 25 Jan 1985, | 14:19 | |
| UTIL:KIP | 0062E8C | | | | Fri, 25 Jan 1985, | 14:19 | |
| SOURCE1:KIP | 0062F9E | 00021B8 | | | Fri, 25 Jan 1985, | 14:21 | |
| SOURCE2:KIP | 00630D0 | 00021BC | | | Fri, 25 Jan 1985, | 14:22 | |
| SOURCEU:KIP | 0063256 | 00021C0 | | | Fri, 25 Jan 1985, | 14:24 | |
| ASCII_68K:KIP | 00635E2 | | | | Fri, 25 Jan 1985, | 14:25 | |
| LOADMEMOR:KIP | 0063816 | 00021EE | | | Fri, 25 Jan 1985, | 14:27 | |
| next address | 0063932 | 000221A | | | | | |
| | | | | | | | |
| (MESSAGE:SODAME) | 0070000 | | | | Mon, 21 Jan 1985, | 10:44 | |
| next address | 0070004 | | | | | | |
| | | | | | | | |
| (SYSTEM:SS_OS) | 007F000 | | | | Tue, 5 Apr 1983, | 13:04 | |
| next address | 007F06A | | | | | | |
| | | | | | | | |
| (DYNAMIC:SS_DYN) | 0048000 | | | | Sat, 31 Mar 1984, | 16:18 | |
| next address | 004805C | | | | | | |
| | | | | | | | |
| (DATA_BASE:SODADB) | 0077000 | | | | Fri, 17 Aug 1984, | 16:03 | |
| next address | 0077084 | | | | | | |
| | | | | | | | |
| Libraries | | | | | | | |
| A5_LIB:L68000 | | | | | | | |
| A5Zudivid:L68000 | 0063932 | | | | Fri, 16 Nov 1984, | 9:03 | |
| A5Zudiv:L68000 | 0063964 | | | | Fri, 16 Nov 1984, | 9:10 | |
| A5Zumult:L68000 | 0063984 | | | | Fri, 16 Nov 1984, | 9:10 | |
| next address | 00639BA | 000221A | | | | | |

XFER address= 0000000 Defined by DEFAULT
No. of passes through libraries= 2
absolute & link_con file name=DISPA:KIP
Total# of bytes loaded= 0005BD8

```
[illegible]
{******************************************************************}
{********** CONSTANTS *********************************************}
{******************************************************************}
CONST
{********** MEASUREMENT TYPES ************************}
TRACEVARIABLES  = 0;
TRACEASSIGNMENT = 1;
TRACEDATA_FLOW  = 2;
TRACEMODULES    = 3;
TRACESTATEMENTS = 4;
TRACEDONTCARE   = 5;
DISPLAYVARIABLE = 6;
MODIFYVARIABLE  = 7;
TIMEMODULES     = 8;
TIMESTATEMENTS  = 9;
COUNTMODULES    =10;
COUNTSTATEMENTS =11;
DISPLAYBREAK    =12;
```

```
(*********** FOOTDC RECORD TYPES**************************)
STATIC_     = 1; (*variable is static*)
DYNAMIC_    = 2; (*variable is dynamic*)
ENTRY_      = 4; (*proc entry*)                        (*tracedataflow, tracemodules*)
EXITT_      = 5; (*proc exit*)                         (*tracedataflow, tracemodules*)
STATEMENTS_ = 6; (*qualified statements information*)  (*tracestatments*)
FRAME_      =10; (*proc frame*)                        (*tracestatments*)
MESSAGE_    =12; (*special message to display*)        (*all measurments*)
TIME_       =20; (*time record*)                       (*timemodules*)
COUNT_      =21; (*count record*)                      (*countstatements*)

(*********** PROCESSORS ***************************)
P_6800           = 5;
P_BPC            = 6;
P_6807           = 7;
P_8085           = 8;
P_Z80            = 9;
P_Z8001          =10;
P_Z8002          =11;
P_8096           =12;
P_68000          =13;

(*********** DATA BASE NODE TYPES, ALSO USED AS STRUC_TYPE IN FMTVAL****)
PROCEDURE_       = 0;
FUNCTION_        = 1;
VARIABLE_        = 2;
PARAMATER_       = 6;
SCALAR_          = 7;
SUBRANGE_        = 8;
POINTER_         = 9;
SET_             =10;
ARRAY_           =11;
RECORD_          =12;
FIELD_           = 3;
VARIANT_         =14;
SELECT_          =13;
REAL_            =16;
CHARACTER_       =17;
FUNDAMENTAL_     =18;   (*Fundamental integer*)
BIT_             =19;   (*C only*)
PARTIAL_         =21;   (*not a node type but is a struc_type in FMTVAL*)
PAD_             =22;   (*not a node type but is a struc_type in FMTVAL*)

(*********** DATA BASE ERROR CODES*****************)
DUP_PROCS_        = 10;
OUT_OF_SPACE      = 11;
NOT_FOUND         = 12;
DB_NOT_FOUND      = 13;
NO_SYM            = 14;
INVALID_TYPE      = 15;
FMGR_ERROR        = 99;

(*********** DISBUFF CONSTANTS *********************)
BLANK            =2020H;
DATALINES        =15;                     (*NO OF DATA LINES IN ONE DISPLAY AND IN DISBUFF*)
MAXLINE          =DATALINES-1;            (*MAX LEGAL LINE   INDEX, LEGAL LINE INDEXES ARE [0..MAXLINE]*)

(*********** MISC CONTSTANTS ********************)
#IF M68000
MAX_DBSIZE       =4096;                   (*Max # of words in any single data base (SODA)   *)
MAXCOLUMN         =239;                   (*Max # characters in a STRNG, max width of vertual screen*)
#ELSE
MAX_DBSIZE       =3072;                   (*Max # of words in any single data base (SPIDER) *)
MAXCOLUMN         =131;                   (*Max # characters in a STRNG, max width of vertual screen*)
#ENDIF
EOF              =1;                      (*FOOTDC EOF*)
PARAMATER        =0;
VARIABLI         =1;
LEFT             =0;
RIGHT            =1;
FWD              =0;
BKWD             =1;
STATS_ONLY       =0;        (*Only applicable to trace statments*)
STATS_AND_DATA   =1;        (*Only applicable to trace statments*)
ABSOLUTE         =0;
```

```
RELETIVE        =1;
START_ON        =0;
UNSIGNED        =2;         (*2 seems like a strange choice but I wouldn't change it if I were you *)
SIGNED          =1;         (*1 seems like a strange choice but I wouldn't change it if I were you *)
CENTER_ON       =1;
END_ON          =2;
#IF M68000
MULTIPLIER      =2;         (*68000*)   (*Converts a word count to a memory address count*)
#ELSE
MULTIPLIER      =1;         (*BPC*)     (*Converts a word count to a memory address count*)
#ENDIF



(****************************************************************************)
(********** TYPES ***********************************************************)
(****************************************************************************)
(*   68000                     BPC                                          *)
(*   INT=SIGNED_16             INT=INTEGER                                  *)
(****************************************************************************)
TYPE
#IF M68000
INT             =SIGNED_16; (*68000*)
DCB_TYPE        =INT;
#ELSE
INT             =INTEGER;   (*BPC*)
DCB_TYPE        = ARRAY[0..16+(4*128)] OF INT;
#ENDIF
DCB_PTR         =^DCB_TYPE;
INTEGER         =ARRAY[0..1] OF INT;      (*32 BITS REGARDLESS OF PROCESSOR*)
PTR             =^INT;                    (*GENERIC PTR TYPE*)
INTEGER_PTR     =^INTEGER;
FMGRNAME_PTR    =^FMGRNAME;
FMGRBUFF_PTR    =^FMGRBUFF;
KC9N_TAG        =ARRAY [0..3 ]  OF INT;
FMGRBUFF        =ARRAY [0..128] OF INT;
FMGRNAME        =ARRAY [0..7]   OF INT;
STRUC_TYPE      =ARRAY [0..31]  OF BYTE;     (*BPC BYTE IS 16 BITS AND MUST BE PACKED FOR SOME OPERATIONS*)
STATUS_TYPE     =(READD,WRITEE,ENTRYY,EXITT,NONEE);


PATH_TYPE=RECORD
  SOURCEFILE_NAME :FMGRNAME; (*Source file name. FILENAME[0]=0 ==> no path information*)
  SOURCEFILE_DISC :INT;      (*Source file disc*)
  PROC_NAME       :FMGRNAME; (*Procedure name.   PROC[0]=0 ==> no proc name and thats ok       (i.e. no error) *)
  END;                       (*                  PROC[0]=-1==> no proc name but there should be (i.e. an error) *)

STRNG_PTR=^STRNG;
STRNG=RECORD
  LEN             :INT;      (*Character count*)
  ASCII           :ARRAY [0..(MAXCOLUMN DIV 2)] OF INT; (*STRNGs are only as big as MAXCOLUMN*)
  END;

DATABASE_PTR=^DATABASE_TYPE;
DATABASE_TYPE=RECORD
  CASE             INT OF
  1:(GENERIC       :ARRAY [0..MAX_DBSIZE-1] OF INT);
  2:(WORD1         :INT; (*MODE_TYPE IN LSB*)
    FLAGS          :INT;
    OFFSET_TO_PARM :INT;
    ADDRESS        :INTEGER;  (*Starting addr of the variable (originally logical but I convert immediatly to phys*)
    OFFSET_TO_TYPE :INT;
    DUMMY          :INT;
    SIZE           :INTEGER;
    IDENTIFIER     :ARRAY [0..7] OF INT); (*Variabel size*)
  END; (*End record*)

SYMBOLPTR=^SYMBOLREC;
SYMBOLREC=RECORD
  PATH           :PATH_TYPE;          (*SOURCE PATH FILE NAME, DISC, PROC*)
  LANGUAGE       :INT;                (*SOURCE LANGUAGE FROM TOM'S PROC_INIT. 0=PASCAL, 1=C*)
  DB_LENGTH      :INT;                (*LENGTH OF FOLLOWING DATA IN WORDS*)
  DATABASE       :DATABASE_TYPE       (*DATA BASE INFO FROM TOM*)
  END; (*End record*)
```

```
ENVIRONMENT_TYPE=RECORD              (*DISPLAY SOFTWARE NEVER CHANGES ENVIRONMENT AFTER IT IS INITIALIZED*)
  LEN1             :INT;             (*FILE MANAGER LENGTH OF FOOTDC DATA RECORD*)
  ID               :INT,             (*SODA CONTROL BOARD ID NUMBER*)
  DATE             :INT;             (*DATE OF MEASUREMENT*)
  TIME             :INT;             (*TIME OF MEASUREMNT*)
  NO_OF_SYMS       :INT;             (*NUMBER OF SYMBOLS IN SYMBOL TABLE*)
  MEASCODE         :INT;             (*MEASUREMENT TYPE*)
  DISPLAY_FROM     :INT;             (*0=START_ON, 1=CENTER_ON. 2=END_ON*)
  TRIG_REC         :INT;             (*FMGR RECORD NUMBER OF TRIGGER IFF CENTER ON*)
  MIN_INDENT       :INT;             (*MIN INDEN IN FILE REL  TO RECORD 1*)
  LEN2             :INT,             (*FILE MANAGER LENGTH FOR 2ND FOOTDC RECORD*)
  ABSFILE_NAME     :FMGRNAME;        (*ABSOLUTE FILE NAME*)
  ABSFILE_DISC     :INT;             (*ABSOLUTE FILE DISC*)
  EMUL_ID          :INT,             (*EMULATION CONTROL BOARD ID NUMBER*) ,
  KC9A_TIME_FLAG   :BOOLEAN          (*KC9A*) (*TRUE IF KC9A IS COUNTING TIME, FALSE IF COUNTING STATES *)
  REAL_TIME        BOOLEAN;          (*KC  *) (*TRUE IF MEASUREMENT IS REAL TIME*)
  PROCESSOR        :INT,             (*PROCESSOR CODE*)
  SYMBOL_TABLE     :ARRAY [0..9] OF SYMBOLPTR;
  INTEL            :BOOLEAN;         (*TRUE IF INTEL BACKWARD ADDRESS*)
  PREFETCH         :BOOLEAN;         (*TRUE IF PREFETCH PROCESSOR*)
  FIRST_DATA_REC   :INT,             (*FMGR RECORD NUMBER OF FIRST DATA RECORD*)
  TRIG_POSITION    :INT;             (*ABSOLUTE POSITION OF TRIG*)
  LAST_POSITION    :INT;             (*ABSOLUTE POSITION OF EOF*)
  DCB              :DCB_PTR;         (*POINTER TO FOOTDC DCB FOR ERROR FORMATTING*)
  END;
ENVIRONMENT_PTR    =^ENVIRONMENT_TYPE;


DATAREC   =RECORD                    (*THE FOOTDC DATA RECORD*)
  BPCDUMMY         :INT;             (*Dummy word to force BPC compiler to use indirect for subsequent fields*)
  PROG_STATUS      :BOOLEAN;
  DATA_STATUS      :BOOLEAN;
  WORD_STATUS      :BOOLEAN;
  HIBYTE_STATUS    :BOOLEAN;
  LOBYTE_STATUS    :BOOLEAN;
  WRITE_STATUS     :BOOLEAN;
  REC_NO           :INT;             (*FMGR RECORD NUMBER*)
  LEN              :INT;             (*FILE MANAGER LENGTH OF FOOTDC DATA RECORD*)
  CASE TYP         :INT OF           (*FOOTDC RECORD TYPE*)
  100:                               (*THERE ARE NOT REALLY ANY TYPs WITH VALUE 100*)
    (WORDS         :ARRAY[2..100] OF INT); (*GENERAL USE BUFFER OF FOOTDC RECORD*)
  STATIC_,DYNAMIC_,STATEMENTS_,ENTRY_,EXIT_:
    (S             :INT;             (*MSB=SYMBOL# FOR MSB OF BUSS_DATA, LSB=SYMBOL# FOR LSB OF BUSS_DATA*)
    BUSS_ADDR      :INTEGER;         (*EMULATION BUSS ADDRESS*)
    PC             :INTEGER;         (*PROGRAM COUNTER*)
    KC9A           :KC9A_TAG;        (*KC9A*) (*64 BIT COUNT TAG OF CURRENT FOOTDC DATA*)
    BUSS_DATA      :INT;             (*16 BIT EMULATION DATA TREATED AS TWO 8 BIT BYTES*)
    STATUS         :INT;             (*STATUS*)
    CASE           INT OF
    ENTRY_,EXIT_ :
      (DUMMY2      :INT;             (*Not used*)
      INDENT       :INT);            (*ENTRY_,EXIT_ ==> LEVEL OF INDENTATION RELETIVE TO 1ST RECORD*)
    STATEMENTS_    :
      (DUMMY3      :INT;             (*Not used*)
      FRAME        :INT);            (*Record # of frame record for current record*)
    STATIC_,
    DYNAMIC_       :
      (STACK       :INTEGER;         (*STATIC_ ==> 0,0  DYNAMCI==> STACK ADDRESS*)
      INDIRECTS    :INT;             (*Number of indirects in INDIRECT_ARRAY. Min=0, max=8*)
      INDIRECT_ARRAY:ARRAY[1..16] OF RECORD
        ADDRESS    :INTEGER;         (*Physical address of indirect*)
        DATA       :INTEGER;         (*Physical address of object of indirect*)
        END));
  FRAME_:
    (SEGMENTS      :ARRAY[0..7] OF INTEGER; (*EIGHT SEGMENT REGESTERS LSW, MSW *)
    STACK_INFO     :ARRAY[1..100] OF RECORD (*ARTIFICIALLY LARGE NUMBER*)
      PROC_NO      :INT;
      STACK        :INTEGER;
      END);
  TIME_:                             (*KC9A*)
    (SY            :INT;             (*KC9A*) (*MSB=SYM# FOR MSB OF BUSS_DATA, LSB=SYM# FOR LSB OF BUSS_DATA*)
    NUM            :INT;             (*KC9A*) (*NUMBER OF SAMPLES*)
    MIN_KC9A       :KC9A_TAG;        (*KC9A*) (*64 BIT MINIMUM TIME*)
    MAX_KC9A       :KC9A_TAG;        (*KC9A*) (*64 BIT MAXIMUM TIME*)
```

```
  MEAN_KC9A      :KC9A_TAG);              (*KC9A*) (*KC9A*) (*KC9A*) (*64 BIT MEAN TIME*)
COUNT_:                                   (*KC9A*)
  (LINE          :INT;                    (*KC9A*) (*LINE NUMBER*)
  CNT            :KC9A_TAG),              (*KC9A*) (*64 BIT COUNT*)
  END;  (*END OF DATAREC RECORD*)
DATAREC_PTR=^DATAREC;

LINE_DISCRIPTOR   =RECORD                 (*DESCRIBES ONE LINE IN BIGBUFF*)
  BPCDUMMY        :INT;                   (*Dummy word to force BPC compiler to use indirect for subsequent fields*)
  STARTING        :INT;                   (*Starting location in footdc data*)
  ENDING          :INT;                   (*Ending  location in footdc data*)
  SOURCELINE_NO   :INT;                   (*SOURCE LINE ASSOCIATED W/THIS LINE OF DISPLAY (IFF APLICABLE*)
  STATUS          :STATUS_TYPE;           (*ENTRY OR EXIT     IF APPLICABLE (TRACE MODULES) *)
  BLANK           :BOOLEAN;               (*TRUE=LINE IS BLANK DUE TO EOF OR BOF*)
  TEXT            :STRNG;                 (*TEXT FOR ONE LINE OF DISPLAY*)
#IF M68000
  KC9A            :KC9A_TAG;              (*KC9A*) (*KC9A OF CURR ACQ MEMORY RECORD ASSOCIATED W/THIS LINE OF DISPLAY*)
  PREV_KC9A       :KC9A_TAG;              (*KC9A*) (*KC9A OF PREV ACQ MEMORY RECORD ASSOCIATED W/THIS LINE OF DISPLAY*)
#ENDIF
  END;
BIGBUFF_TYPE      =ARRAY[0..MAXLINE] OF LINE_DISCRIPTOR;
BIGBUFF_PTR       =^BIGBUFF_TYPE;

PRIMITIVE_TYPE    =RECORD                 (*RETURNS INFORMATION FROM BUILDPRIM, NO INFO SENT IN PRIM*)
  (******* The first n fields are local in the sence that they do not return any values to the main program*)
  DUMMY           :BOOLEAN;               (*TO AVOID 508  WARNINGS FROM COMPILER*)
  PAD             :BOOLEAN;               (*TRUE IF STRUC IS A PAD BYTE*)
  USED            :STRUC_TYPE;            (*TRUE (1) IF CORROSPONDING STRUC BYTE IS USED, FALSE (0) IF BYTE NOT USED*)
  STRUC           :STRUC_TYPE;            (*32 LOGICAL BYTES (64 PHYSICAL BYTES IN BPC) BIG ENOUGH FOR 256 ELEMENT SET*)
  STRUC_SIZE      :INT;                   (*SIZE OF STRUCTURE IN BYTES*)
  STRUC_ADDR      :INTEGER;               (*PHYSICAL ADDRESS OF START OF STRUCTURE*)
  COUNTER         :INT;                   (*NUMBER OF BYTES USED IN STRUCTURE*)
  (******* The following fields are global in the sence that they return values to the main program*)
  STARTING        :INT;                   (*STARTING POSITION OF PRIMITIVE*)
  ENDING          :INT;                   (*ENDING   POSITION OF PRIMITIVE*)
  SYM             :STRNG;                 (*SYMBOL STRING*)
  SYM_OVERFLOW    :ARRAY[0..9] OF INT;    (*CATCHES ANY OVERFLOW WHEN FORMATTING SYM STRING. MUST IMEDIATLY FOLLOW SYM*)
  SYM_PATH        :PATH_TYPE;             (*PATH INFORMATION FOR SYMBOL*)
  VAL             :STRNG;                 (*VALUE  STRING*)
  VAL_OVERFLOW    :ARRAY[0..9] OF INT;    (*CATCHES ANY OVERFLOW WHEN FORMATTING VAL STRING. MUST IMEDIATLY FOLLOW VAL*)
  INDENT          :INT;                   (*INDENTATION LEVEL FOR SUBROUTINE NAME. TRACEMODULES ONLY*)
  SOURCELINE      :STRNG;                 (**)
  SOURCELINE_NO   :INT;                   (*SOURCELINE NUMBER WITHIN THE SOURCE FILE.  0,-1,-2 ==> ERROR*)
  SOURCELINE_PATH :PATH_TYPE;             (*PATH INFORMATION FOR SOURCE LINE*)
  STATUS          :STATUS_TYPE;           (*READ/WRITE/ENTRY/EXIT*)
  MESSAGE         :BOOLEAN;               (*TRUE IFF SPECIAL MESSAGE (IN SYM STRNG) *)
#IF M68000
  KC9A            :KC9A_TAG;              (*KC9A*) (*COUNT TAG ASSOCIATED WITH STARTING POSITION OF THIS PRIMITIVE*)
  KC9A_MIN        :KC9A_TAG;              (*KC9A*) (*COUNT TAG ASSOCIATED WITH STARTING POSITION OF THIS PRIMITIVE*)
  KC9A_MAX        :KC9A_TAG;              (*KC9A*) (*COUNT TAG ASSOCIATED WITH STARTING POSITION OF THIS PRIMITIVE*)
  KC9A_COUNT      :INT;                   (*KC9A*) (*COUNT TAG ASSOCIATED WITH STARTING POSITION OF THIS PRIMITIVE*)
#ENDIF
  END;
PRIMITIVE_PTR     =^PRIMITIVE_TYPE;
$LIST ON$
CONST

DCB_SIZE = 4;
MAX_REC_SIZE = 128;

TYPE

  S_INT = SIGNED_16;
  S_UNS = UNSIGNED_16;
  POINTER = ^S_INT;
  BUFFTYPE = ARRAY [0..MAX_REC_SIZE] OF S_INT;
  BUFFPTR = ^BUFFTYPE;
  DCBTYPE = S_INT;
  DCBPTR = ^DCBTYPE;
  AR2_INT = ARRAY[0..1] OF S_INT;
  DOUBLE_WORD = RECORD
    LSW,MSW:S_INT;
  END;
  DOUBLE_PTR = ^DOUBLE_WORD;
```

```
BITS = (BIT0,BIT1,BIT2,BIT3,BIT4,BIT5,BIT6,BIT7,BIT8,BIT9,BIT10,
       BIT11,BIT12,BIT13,BIT14,BIT15);
SOB = SET OF BITS;
NAME = ARRAY [0..7] OF S_INT;
NAMEPTR = ^NAME;
COMPLEX_VALUE = RECORD
   VALUE,MASK:DOUBLE_WORD;
END;

GEN_TYPE = RECORD
   CASE S_INT OF
      0:  (S:SET OF BITS);
      1:  (I:INTEGER);
      2:  (P:^S_INT);
   END;
TYPE

  PATH = RECORD
     SYM:NAME;
     SUBNO,PROGNO:S_INT;
  END;

  PATHPTR = ^PATH;

  SYMSET = (PROGR,PROC,FUNC,VARIABLE,CONSTANT,PARM,EXTSUBR);

  PROG_REC = RECORD
     NODE_SIZE:S_INT;
     NODE_PTR:S_UNS;
     PROCID_DISC:S_INT;
     LANGUAGE:S_INT;
     PROG_LOAD:AR2_INT;
     MIN:AR2_INT;           (* MIN LEVEL1 STATIC VAR ADDRESS *)
     MAX:AR2_INT;           (* MAX LEVEL1 STATIC VAR ADDRESS *)
     ENTRY:AR2_INT;
     EXIT:AR2_INT;
     FNAME:NAME;
     PNAME:NAME,
  END;


  NODE_TBL_ENTRY = RECORD
     SUBNO_SIZE:S_INT;
     RECNO:S_INT;
     PARENT_OFF:S_INT;
     MIN,MAX:AR2_INT;
     PROC_NAME:NAME;
  END;
  NODE_PTR = ^ NODE_TBL_ENTRY;

  SUBR_REC = RECORD
     LEVEL_TYPE     :S_INT;
     FLAGS          :SOB;
     SUBNO,
     PARM_OFFSET,
     FUNC_OFFSET,
     VAR_OFFSET     :S_INT;
     ENTRY_ADDR     :AR2_INT;
     EXIT_ADDR      :AR2_INT;
     DATA_ADDR      :AR2_INT;
     DATA_SIZE      :S_INT;
     STATIC         :S_INT;
  END;


  VAR_REC = RECORD
     SIZE_TYPE      :S_INT;
     FLAGS          :SOB;
     SUB_OFFSET     :S_INT;
     ADDRESS        :AR2_INT;
     TYPE_OFFSET,
     NEXT_OFFSET    :S_INT;
     VNAME          :NAME;
  END;
```

```
EXTPROC_REC = RECORD
   SIZE_TYPE,
   TYPE_OFFSET,
   SUBNO,
   PARM_OFFSET,
   NEXT_OFFSET    :S_INT;
   ENAME          :NAME;
END;

SUBR_PTR = ^SUBR_REC;
VAR_PTR = ^VAR_REC;
EXTPROC_PTR = ^EXTPROC_REC;
PROG_PTR = ^PROG_REC;

GENERIC_PTR = RECORD
   CASE S_INT OF
      1: (SPTR:SUBR_PTR);
      2: (VPTR:VAR_PTR);
      3: (EXTP:EXTPROC_PTR);
      4: (PPTR:PROG_PTR);
END;
"68000"
*                                                   FILE=DATA_BASE:SODADB
*
* BELOW IS A LIST OF ALL DATABASE ERRORS POSSIBLE FOR SPIDER AND SODA:
*          sp INDICATS THAT IS A SPIDER ONLY MESSAGE
*
*
* DUP_PROCS = 10;
* OUT_OF_SPACE = 11;
* NOT_FOUND = 12;
* DB_FILE_NOT_FOUND = 13;    (*NO FILE OF TYPE comp_db*)
* NO_SYM = 14;
* INVALID_TYPE = 15;
* UNUSED = 16;
* UNUSED = 17;
* UNUSED = 18;
* UNUSED = 19;
* (* ERROR MESSAGES FROM 20 ON WILL OUTPUT THERE OWN MESSAGE *)
* BAD_DB = 20;
* NO_SUPPORT = 21;           (* ERRORS 21 THRU 26 ARE SU_ANLY ERRORS 1 THRU 6 *)
* NODE_CONTENTION = 22;
* RBUF_CONTENTION = 23;
* OUT_OF_QUEUE = 24;
* PROG_NOT FOUND = 26;       (*PROGNO is not the number of an initialize program*)
* BAD_ASM_SYM = 27;
* ADDRESS_NOT_VALID = 28;            sp
* LINES_DIF_FILES = 29;              sp
* LINES_DIF_PROCS = 30;              sp
* TOO_MANY_SYMS = 31;                sp
* NO_FNAME = 32;                     sp
* NO_PROCNAME = 33;                  sp
* NULL_PROC = 34;                    sp
* BAD_LINE_RANGE = 35;               sp
* PERFORMANCE = 36;                  sp
*
*
*
*PROCEDURE PROG_INIT(FNAME:NAMEPTR; VAR DISC:S_INT; VAR PROGNO,PROCID,LANGUAGE,ERROR:S_INT);
*(**********************************************************************
*THIS PROCEDURE OPENS THE DATABASE FILE OF FNAME AND PUTS THE FIRST
*RECORD (THE PROG_ARRAY RECORD) INTO THE PROG ARRAY.
*IT ALSO RETURNS THE PROGNO THAT IT PUT THE FILE AT
*IF THE FILE IS ALREADY IN THE PROG ARRAY THEN IT RETURNS ITS NUMBER
*ALSO RETURNED IS THE PROCESSOR ID AND THE LANGUAGE OF THE DATABASE FILE
*
* ERRORS
* 0 - NO ERROR
* DB_FILE_NOT_FOUND    (File not found, file = FNAME:comp_db)
* FMGR ERRORS     (Fatal: Message displayed and error code)=20)
***********************************************************************)
*
*
*
```

```
*
*
*FUNCTION PROG_NUM_PROG(PTR:NAMEPTR):S_INT;
*(*******************************************************************
*THIS FUNCTION RETURNS THE PROGRAM NUMBER OF A PROGRAM NAME POINTED
*TO BY PTR IF FOUND ELSE IT RETURNS 0
********************************************************************)
*
*
*
*
*FUNCTION PROG_NUM_FILE(PTR:NAMEPTR; DISC:S_INT):S_INT;
*(*******************************************************************
*THIS FUNCTION RETURNS THE PROGRAM NUMBER OF A FILE NAME POINTED
*TO BY PTR AND A DISC, IF FOUND ELSE IT RETURNS 0.
*A -1 DISC IMPLIES ANY DISC
*******************************************************************)
*
*
*
*
*
****************************************************************************
*
*  SYMSET = (PROG,PROC,FUNC,VARIABLE,CONSTANT,PARM,EXTSUBR)
*
*  PATHPTR = ^PATH;
*
*  PATH=RECORD
*     SYM:NAME;
*     SUBNO,PROGNO:S_INT;
*  END;
*
*
*PROCEDURE FIND_SYM(SPTR:PATHPTR; PTR:POINTER; VAR SYMTYPE:SYMSET; VAR LENGTH,ERROR:S_INT);
*(*************************************************************************
*  THIS PROCEDURE PUTS THE SYMBOL AT THE ADDRESS (IN PTR) UP TO SYMBUFFSIZE.
*  GIVEN A POINTER TO THE PATH NAME (SPTR). IT ALSO RETURNS THE FOLLOWING
*  ERRORS:
* PROG_NOT FOUND  (Fatal: PROGNO is not the number of an initialize program)
* NOT_FOUND       (CAN BE FROM VAR OR PROC NOT BEING FOUND)
* DUP_PROCS       (IF THE DATABASE HAS TWO PROCEDURES OF THE SAME NAME)
* OUT_OF_SPACE    (SIZE GIVEN WAS NOT ENOUGH, POINTERS TO EXTRA DATA ZEROED)
* INVALID_TYPE    (TYPE NOT SUPPORTED)
* FMGR ERRORS     (Fatal: Message displayed and error code)=20)
*
*  IT ALSO RETURNS THE THE TYPE OF THE SYMBOL INTO ONE OF THE FOLLOWING
*     SYMSET = (PROG,PROC,FUNC,VARIABLE,CONSTANT,PARM,EXTSUBR)
*  LENGTH ON INPUT IS THE NUMBER OF WORDS AVAILABLE FOR THE SYMBOL
*  ON OUTPUT IS THE NUMBER OF WORDS USED
*
*
*  THIS PROCEDURE USES A SHORT PATH NAME FOR INPUT.  A PATH NAME IS A
*  WAY TO UNIQUELY IDENTIFY THE SYMBOL. IT CONSISTS OF THE SYMBOL NAME
*  FOLLOWED BY THE PROCEDURE NUMBER ITS DECLARED IN, FOLLOWED BY THE
*  PROGRAM NUMBER THE PROCEDURE IS DECLARED IN.
*  THIS PROCEDURE ASSUMES THAT THERE ARE NO TWO PROCEDURES DECLARED IN
*  THE PROGRAM WITH THE SAME NAME.
*  IT WILL RETURN AN ERROR CODE IF
*  IT DETECTS TWO PROCEDURES WITH THE SAME NAME.
*
*  FOR SYSTEMS THAT DO NOT HAVE THIS LIMITATION ANOTHER FIND_SYM WAS
*  CREATED AND IS IN THE FILE DB_ACCESS:KAREN.  THIS PROCEDURE REQUIRES
*  THE NAME OF EVERY PROCEDURE THAT IS SCOPED TO A GIVEN SYMBOL.
**************************************************************************)
*
*
*
*
*
*PROCEDURE FIND_LINE_NO(LINENO,PROGNO:S_INT;
*                       VAR ADDRESS:AR2_INT; VAR ERROR:S_INT);
*(*************************************************************************
*THIS PROCEDURE RETURNS THE ADDRESS OF A GIVEN LINE NUMBER OF A PASCAL
```

```
*PROGRAM. IT RETURNS THE FOLLOWING ERRORS:
*
* PROG_NOT FOUND  (Fatal: PROGNO is not the number of an initialize program)
* NOT_FOUND       (LINE NUMBER NOT FOUND)
* NO_SUPPORT      (PROCESSOR NOT SUPPORTED , OLD 8 BIT LINE NUMBERS)
* FMGR ERRORS     (Fatal: Message displayed and error code)=20)  (except EOF)
*****************************************************************************)
*
*
*
*
*
*PROCEDURE LN_HANDLER(PROGNO:S_INT; ADDRESS:AR2_INT; VAR FIRST:BOOLEAN; VAR START_ADDR,END_ADDR:AR2_INT;
*                    VAR LINENO,ERROR:S_INT);
*(***************************************************************************
*THIS PROCEDURE RETURNS THE LINE NUMBER THAT
*CONTAINS THE LINE, GIVEN AN ADDRESS WITHIN THE LINE.  IT RETURNS THE
*FOLLOWING ERRORS
*
* PROG_NOT FOUND  (Fatal: PROGNO is not the number of an initialize program)
* NO_SUPPORT      (Fatal: processor not supprted)
* NOT_FOUND       (LINE NOT FOUND FOR ADDRESS)
* BAD_ASM_SYM
* FMGR ERRORS     (Fatal: Message displayed and error code)=20)
****************************************************************************)
*
*
*
*PROCEDURE LN_FETCHER(PROGNO,LANG,EMULID:S_INT; SYM:NAMEPTR; ADDRESS:AR2_INT;
*                    SCLN:PTRTYPE; VAR LINENO,SIZE,ERROR:S_INT);
****************************************************************************
*THIS PROCEDURE FINDS THE SOURCE CODE STRING CORRESPONDING TO SOME
*ADDRESS.  PROGNO IS THE PROGRAM NUMBER, SYM IS THE EXPECTED
*SYMBOL NAME TO FIND IN THE SOURCE CODE ( FOR PREFETCH ENVIROMENT ),
*ADDRESS IS THE ADDRESS OF THE SOURCE REQUESTED AND SCLN IS THE
*POINTER TO THE SOURCE LINE.  SIZE IS THE NUMBER OR CHARS. LINENO IS THE LINE
*NUMBER.
*
*  IT IS THE CALLERS RESPONSIBLITY TO HAVE SCLN POINT TO A 121 WORD
*  BUFFER
*
*
*ERROR CODES
* PROG_NOT FOUND  (Fatal: PROGNO is not the number of an initialize program)
* NO_SUPPORT      (Fatal: Processor not supported)
* NOT_FOUND       (Source line not found.   eg. no asm_sym file, code before BEGIN, address is local static_
* NO_SYM          (Requested symbol not on line, prefetch processors only)
* BAD_ASM_SYM     (Fatal: asm_syn file is bad)
* FMGR ERRORS     (Fatal: Message displayed and error code)=20)
****************************************************************************)
*
*
*
******************************************************************************
*
*
*       RECPOINTER=^VARENTRY;
*       VARENTRY=RECORD
*               NEXTVAR:RECPOINTER;
*               WORD:WORDARRAY;
*               END;
*
*
*PROCEDURE SCLN_FETCH(PROGNO:S_INT;LINENO:S_INT; STRINGPTR:POINTER; VAR SIZE,ERROR:S_INT);
*
**********************************************************************************************************
* PURPOSE :  GIVEN A PROGRAM NUMBER AND RECORD NUMBER, RETRIEVE THE SOURCE LINE FROM THE SOURCE FILE
*            CONTAINING THE SOURCE LINES OF PROGRAM NUMBER.
*            IT IS THE CALLING ROUTINES RESPONSIBLITY TO PROVIDE THE
*            SPACE FOR THE RECORD (IE. STRINGPTR MUST POINT TO A BUFFER
*            OF 121 WORDS )
* INPUTS  :
*     PROGNO THE PROGRAM NUMBER
*     LINENO THE RECORD NUMBER WITHIN THE SOURCE FILE.
*     STRINGPTR = A POINTER TO A 121 WORD BUFFER
```

```
* OUPUTS  :
*      SIZE  THE COUNT OF THE CHARS IN THE SOURCE LINE STRING.
*      ERRORS
* PROG_NOT FOUND  (Fatal: PROGNO is not the number of an initialize program)
* NOT_FOUND       (LINE NO NOT FOUND)
* FMGR ERRORS     (Fatal: Message displayed and error code)=20)
*****************************************************************************************************************)
*
*
*
*PROCEDURE LINE_SUB(PROGNO:S_INT; VAR ADDRESS:AR2_INT;
*                   VAR SUBNO,ERROR:S_INT);
*(*********************************************************************
*  THIS PROCEDURE RETURNS THE SUBROUTINE NUMBER OF A GIVEN ADDRESS.
*  IT CHECKS ALL THE ENTRY EXIT ADDRESSES OF ALL THE PROCEDURES UNTIL
*  IT FINDS ON THAT THE ADDRESS IS WITHIN.  IF NO PROCEDURE IS FOUND
*  THEN IT CHECKS TO SEE IF THE LINE NUMBER BELONGS TO THE MAIN PROGRAM
*  (SUBNO=0).
* ERRORS:
* PROG_NOT FOUND  (Fatal: PROGNO is not the number of an initialize program)
* NOT_FOUND       (Subroutine not found.  ADDRESS is not part of main program or any procedure)
*                 (due to dup procs, address is local static, code before BEGIN ect)
* FMGR ERRORS     (Fatal: Message displayed and error code)=20)
**********************************************************************)
*
*
*
*
*
*FUNCTION PROC_NUM(PROGNO:S_INT; NPTR:NAMEPTR; VAR ERROR:S_INT):S_INT;
*(**********************************************************************
*  THIS FUNCTION RETURNS THE SUBNO OF A PROCEDURE GIVEN ITS NAME
*  POINTED TO BY NPTR.
*  IF IT FINDS MORE THAN ONE PROCEDURE WITH THE SAME NAME THEN
*  IT RETURNS ERRORS OF:
*
* DUP_PROCS
* PROG_NOT_FOUND  (Should not occure if PROG_INIT returned a  good PROGNO)
* NOT_FOUND       (SUBNO NOT FOUND)
* BAD_DB
*
*  IF IT DOES NOT FIND THE PROCEDURE THEN THE FUNCTION VALUE IS SET TO ZERO
**********************************************************************)
*
*
*
*
*PROCEDURE PROG_FILE(PROGNO:S_INT; FPTR:NAMEPTR; VAR DISC,ERROR:S_INT);
*(***************************************************************************
*THIS PROCEDURE COPIES A SOURCE FILE NAME TO AN ARRAY[0..7] POINTED TO BY FPTR AND ITS DISC
*GIVEN A PROGRAM NUMBER. IT RETURNS ERRORS OF
* BAD_DB
* PROG_NOT FOUND  (Fatal: PROGNO is not the number of an initialize program)
***************************************************************************)
*
*
*
*PROCEDURE PROG_PNAME(PROGNO:S_INT; FPTR:NAMEPTR; VAR ERROR:S_INT);
*(***************************************************************************
*THIS PROCEDURE COPIES A PROGRAM NAME TO AN ARRAY[0..7] POINTED TO BY FPTR AND ITS DISC
*GIVEN A PROGRAM NUMBER. IT RETURNS AN ERROR OF
* PROG_NOT FOUND  (Fatal: PROGNO is not the number of an initialize program)
***************************************************************************)
*
*
*
*PROCEDURE SUB_NAME(PNUM,SUBNO:S_INT; FNAME:NAMEPTR; VAR ERROR:S_INT);
*(***************************************************************************
*  THIS PROCEDURE COPYIES THE SUBROUTINE NAME TO AN ARRAY [0..7] GIVEN A PROG NUM AND
*  A SUBROUTINE NUMBER. THE NAME IS IN STANDARD PISCES FORMAT.
*  ERRORS:
*
* PROG_NOT FOUND  (Fatal: PROGNO is not the number of an initialize program)
* NOT_FOUND       (SUB_NAME not found.  Should not occure if SUBNO is known to be good)
* FMGR ERRORS     (Fatal: Message displayed and error code)=20)
```

```
*****************************************************************************)
*
*
*
*
*PROCEDURE STATIC_VAR(PROGNO:S_INT; VAR SUBNO:S_INT; ABS_FILE:NAMEPTR; ABS_DISC:S_INT; VAR ADDRESS:AR2_INT;
*                     DB_PTR:POINTER; VAR COUNT,ERROR:S_INT);
*(****************************************************************************
*THIS PROCEDURE FETCHES THE STATIC VARIABLE RECORD AND PUTS IT IN THE
*AREA POINTED TO BY DB_PTR. IT WILL ONLY USE COUNT WORDS OF DATA, IF
*THE VARIABLE DOESN'T FIT IT WILL RETURN AND ERROR ELSE IT WILL RETURN
*THE NUMBER OF WORDS USED BY THE VARIABLE IN COUNT.
*THE VARIABLE FETCHED IS THE ONE SUCH THAT ADDRESS IS WITHIN ITS ADDRESS
*RANGE.
*SUBNO ON INPUT IS THE SUBROUTINE BEING TRACED. ON OUTPUT IT IS THE
*SUBNO OF THE VARIABLE FOUND
*ERROR CODES
* PROG_NOT FOUND  (Fatal: PROGNO is not the number of an initialize program)
* NOT_FOUND       (STATIC VARIABLE NOT FOUND FOR ADDRESS)
* OUT_OF_SPACE    (Not enough room allowed for data base information)
* INVALID_TYPE    (TYPE NOT SUPPORTED)
* FMGR ERRORS     (Fatal: Message displayed and error code)=20)
*****************************************************************************)
*
*
*
*
*PROCEDURE DYNA_VAR(PROGNO,SUBNO,OFFSET:S_INT; DB_PTR:POINTER; V_TYP:V_TYPES;
*                   VAR COUNT,ERROR:S_INT);
*(****************************************************************************
*THIS PROCEDURE RETURNS THE DATABASE INFORMATION OF A VARIABLE OR
*PARAMETER WHOSE PROCEDURE AND STACK OFFSET IS KNOWN.  (IE IT WILL BE
*ASSUMED THAT THE VARIABLE OR PARAMETER IS LOCATED ON THE STACK)
*
*ON INPUT: DB_PTR IS SET TO AN AREA OF SIZE COUNT.
*          V_TYPE = 0 IF PARAMETER
*                 = 1 IF VARIABLE
*
*ON OUTPUT: THE DATABASE INFORMATION IS READ INTO THE AREA POINTED TO
*           BY DB_PTR AND COUNT IS SET TO AMOUNT OF WORDS USED
*
* ERROR RETURNS
* PROG_NOT FOUND  (Fatal: PROGNO is not the number of an initialize program)
* NOT_FOUND       (DYNAMIC VARIABLE NOT FOUND)
* OUT_OF_SPACE    (Not enough room allowed for data base information)
* INVALID_TYPE    (TYPE NOT SUPPORTED)
* FMGR ERRORS     (Fatal: Message displayed and error code)=20)
*****************************************************************************)
*
*
*
*
*PROCEDURE PROC_STACK(PROGNO,SUBNO:S_INT; VAR RECUR_FLAG:BOOLEAN;
*                     VAR PARM_MIN,PARM_MAX,VAR_MIN,VAR_MAX,ERROR:S_INT);
*(****************************************************************************
*THIS PROCEDURE RETURNS THE STACK INFORMATION FOR A PROCEDURE.  IT SETS
*RECUR_FLAG BASED UPON IF THE PROCEDURE IS RECUSIVE AND RETURNS THE
*STACK OFFSET RANGES FOR THE PARAMETERS AND THE LOCAL VARIABLES IF ANY.
*IF NO PARMS OR LOCAL VARIABLES THEN THE CORRESPONDING MAX IS SET TO 0.
* ERRORS
* PROG_NOT FOUND  (Fatal: PROGNO is not the number of an initialize program)
* NOT_FOUND       (SUB_NAME not found.  Should not occure if SUBNO is known to be good)
* FMGR ERRORS     (Fatal: Message displayed and error code)=20)
*****************************************************************************)
*
*
*
*
*
*PROCEDURE PARENT(PROGNO,SUBNO:S_INT; VAR PARENT_NO:S_INT; PATH:PATHPTR;
*                 VAR ERROR:S_INT);
*(****************************************************************************
*THIS PROCEDURE RETURNS THE PARENT SUBROUTINE NUMBER AND THE PARENT'S PATH
*NAME GIVEN THE PROGNO, AND SUBNO OF A PROCEDURE.
*ON INPUT PATH MUST POINT TO A PATH RECORD WHICH GETS FILLED IN ON OUTPUT.
```

```
*IF THE PROGRAM IS THE PARENT THE PARENT_NO IS SET TO 0 AND PATH REMAINS
*UNINITIALIZED.
* ERRORS
* PROG_NOT FOUND  (Fatal: PROGNO is not the number of an initialize program)
* NOT_FOUND       (SUBNO NOT FOUND)
* FMGR ERRORS     (Fatal: Message displayed and error code>=20)
*****************************************************************************)
*
*
*
*
*PROCEDURE WHICH_FILE(ABS_FILE:NAMEPTR; ABS_DISC:S_INT; VAR ADDRESS,START_ADDR,END_ADDR:AR2_INT;
*                     FNAME:NAMEPTR; VAR DISC,RELOC,ERROR:S_INT);
*(*****************************************************************************
*THIS PROCEDURE TAKES A GIVEN ABSOLUTE FILE NAME AND DISC AND A GIVEN
*PHYSICIAL ADDRESS AND RETURNS THE NAME AND DISC OF THE SOURCE FILE
*THAT THE ADDRESS IS CONTAINED WITHIN.  IT SETS ERROR TO -3 IF
*IF THE ADDRESS CAN'T BE FOUND.
*IT IS ASSUMED THAT THE ADDRESS IS A PHYSICAL ADDRESS
*IT ALSO RETURNS THE RELOCATION TYPE OF THE ADDRESS IN RELOC
*  0 = ABS RELOCATION
*  1 = PROGRAM RELOCATION
*  2 = DATA RELOCATION
*  3 = COMMON RELOCATION
* ERRORS
* NOT_FOUND       (Source file not found. PC is not part of absolute file*)
* FMGR ERRORS     (Fatal: Message displayed and error code>=20)
***************************************************************************)
*
*
*PROCEDURE CLOSE_DB_FILES;
*(**************************************************************************
*THIS PROCEDURE CLOSES ALL OPEN FILES IN THE DATABASE
***************************************************************************)
*
*(*****************************************************************)
*FUNCTION SUB_INDEX(PROGNO,SUBNO:S_INT; VAR NEXT_SUB:S_INT):PTRTYPE;
*(*****************************************************************
*  THIS FUNCTION RETURNS THE ENTRY ADDRESS OF A PROC ENTRY INTO
*  THE NODE TABLE.  IT MATCHES SUBROUTINE NUMBERS UNTIL THE
*  ENTRY IS FOUND OR THE NODE HAS BEEN COMPLETELY REACHED.
*  IF IT CAN'T BE FOUND THEN ZERO IS RETURNED
******************************************************************)
*
*
*PROCEDURE FILE_RANGE(ABS_FILE:NAMEPTR; ABS_DISC:S_INT; FNAME:NAMEPTR; DISC:S_INT;
*                     VAR START_ADDR,END_ADDR:AR2_INT; VAR ERROR:S_INT);
*(*****************************************************************************
*THIS PROCEDURE TAKES A GIVEN ABSOLUTE FILE NAME AND DISC AND A GIVEN
*SOURCE FILE AND DISC AND RETURNS THE ADDRESS RANGE OF COORESPONDING RELOCATABLE
*FILES PROGRAM SPACE.  IT SETS ERROR TO 12 (NOT FOUND)
*IF THE FILE OR ITS RELOCATABLE CAN'T BE FOUND.
*THE ADDRESSES RETURNED ARE LOGICAL ADDRESSES.
* FMGR ERRORS     (Fatal: Message displayed and error code>=20)
*****************************************************************************)
*
*
*PROCEDURE GET_GLB_SYM(ABS_FILE:NAMEPTR; ABS_DISC:S_INT; SPTR:NAMEPTR;
*                      VAR ADDRESS:AR2_INT; VAR ERROR:S_INT);
*(*********************************************************************
*THIS PROCEDURE FINDS THE ADDRESS OF THE GLOBAL SYMBOL POINTED TO BY SPTR.
*THE LINK SYM FILE  IS SEARCHED FOR THE REQUIRED SYMBOL.
*IF FOUND THEN THE LOGICAL ADDRESS IS RETURNED.
*THE FOLLOWING ERRORS ARE RETURNED:
*    12 - SYMBOL NOT FOUND
*    14 - ABS_FILE IS BLANK  (NO_SYM ERROR)
* FMGR ERRORS     (Fatal: Message displayed and error code>=20)
**********************************************************************)
*
*
*
*
        GLB      PROG_INIT
        GLB      PROG_NUM_PROG
        GLB      PROG_NUM_FILE
```

```
              GLB     FIND_SYM
              GLB     FIND_LINE_NO
              GLB     LN_HANDLER
              GLB     LN_FETCHER
              GLB     SCLN_FETCH
              GLB     LINE_SUB
              GLB     PROC_NUM
              GLB     PROG_FILE
              GLB     SUB_NAME
              GLB     STATIC_VAR
              GLB     DYNA_VAR
              GLB     PROC_STACK
              GLB     PARENT
              GLB     WHICH_FILE
              GLB     PROG_PNAME
              GLB     CLOSE_DB_FILES
              GLB     SUB_INDEX
              GLB     FILE_RANGE
              GLB     GET_GLB_SYM
000000    PROG_INIT
000000            DS.B    6
000006    PROG_NUM_PROG
000006            DS.B    6
00000C    PROG_NUM_FILE
00000C            DS.B    6
000012    FIND_SYM
000012            DS.B    6
000018    FIND_LINE_NO
000018            DS.B    6
00001E    LN_HANDLER
00001E            DS.B    6
000024    LN_FETCHER
000024            DS.B    6
00002A    SCLN_FETCH
00002A            DS.B    6
000030    LINE_SUB
000030            DS.B    6
000036    PROC_NUM
000036            DS.B    6
00003C    PROG_FILE
00003C            DS.B    6
000042    SUB_NAME
000042            DS.B    6
000048    STATIC_VAR
000048            DS.B    6
00004E    DYNA_VAR
00004E            DS.B    6
000054    PROC_STACK
000054            DS.B    6
00005A    PARENT
00005A            DS.B    6
000060    WHICH_FILE
000060            DS.B    6
000066    PROG_PNAME
000066            DS.B    6
00006C    CLOSE_DB_FILES
00006C            DS.B    6
000072    SUB_INDEX
000072            DS.B    6
000078    FILE_RANGE
000078            DS.B    6
00007E    GET_GLB_SYM
00007E            DS.B    6

Errors=   0
```

```
LOCATION OBJECT CODE LINE     SOURCE LINE

                               "68000"
                                        EXTERNAL       PROG_INIT
                                        EXTERNAL       PROG_NUM_PROG
                                        EXTERNAL       PROG_NUM_FILE
                                        EXTERNAL       FIND_SYM
                                        EXTERNAL       FIND_LINE_NO
                                        EXTERNAL       LN_HANDLER
                                        EXTERNAL       LN_FETCHER
                                        EXTERNAL       SCLN_FETCH
                                        EXTERNAL       LINE_SUB
                                        EXTERNAL       PROC_NUM
                                        EXTERNAL       PROG_FILE
                                        EXTERNAL       SUB_NAME
                                        EXTERNAL       STATIC_VAR
                                        EXTERNAL       DYNA_VAR
                                        EXTERNAL       PROC_STACK
                                        EXTERNAL       PARENT
                                        EXTERNAL       WHICH_FILE
                                        EXTERNAL       PROG_PNAME
                                        EXTERNAL       CLOSE_DB_FILES
                                        EXTERNAL       SUB_INDEX
                                        EXTERNAL       FILE_RANGE
                                        EXTERNAL       GET_GLB_SYM
  000000 4EF9                           JMP       PROG_INIT
  000006 4EF9                           JMP       PROG_NUM_PROG
  00000C 4EF9                           JMP       PROG_NUM_FILE
  000012 4EF9                           JMP       FIND_SYM
  000018 4EF9                           JMP       FIND_LINE_NO
  00001E 4EF9                           JMP       LN_HANDLER
  000024 4EF9                           JMP       LN_FETCHER
  00002A 4EF9                           JMP       SCLN_FETCH
  000030 4EF9                           JMP       LINE_SUB
  000036 4EF9                           JMP       PROC_NUM
  00003C 4EF9                           JMP       PROG_FILE
  000042 4EF9                           JMP       SUB_NAME
  000048 4EF9                           JMP       STATIC_VAR
  00004E 4EF9                           JMP       DYNA_VAR
  000054 4EF9                           JMP       PROC_STACK
  00005A 4EF9                           JMP       PARENT
  000060 4EF9                           JMP       WHICH_FILE
  000066 4EF9                           JMP       PROG_PNAME
  00006C 4EF9                           JMP       CLOSE_DB_FILES
  000072 4EF9                           JMP       SUB_INDEX
  000078 4EF9                           JMP       FILE_RANGE
  00007E 4EF9                           JMP       GET_GLB_SYM

Errors=    0

 00000000  1  "68000"  PREPROCESS
 00000000  1  $EXTENSIONS ON$
 00000000  1  PROGRAM DATA_BASE_UTILITES;
 00000000  1
 00000000  1  #INCLUDE ERROR:INCLUD
 00000000  1
 00000000  1  #DEFINE IO_ERROR(ERROR,DCB)    BEGIN                \
 00000000  1                                  IOERROR(ERROR,DCB);\
 00000000  1                                  GOTO 10;            \
 00000000  1                                  END
 00000000  1  #DEFINE SYMERROR(ERROR,NAME)    BEGIN                \
 00000000  1                                   SYM_ERROR(ERROR,NAME);\
 00000000  1                                   GOTO 10;            \
 00000000  1                                   END
 00000000  1
 00000000  1  CONST
 00000000  1    SODA_SYM=15;   (* TYPE FOR SODA SYMBOL FILE *)
 00000000  1    DCBSIZE=4;
 00000000  1    MAX_PROG = SIGNED_16(10);  (* MAX_SYMS *)
 00000000  1    REVNO = 1;
 00000000  1    REVLOC = 10;
 00000000  1
 00000000  1
 00000000  1  #INCLUDE STD_DATA:SODADB
```

```
00000000  1  #INCLUDE SYMBOL:SODACB
00000000  1
00000000  1
00000000  1  TYPE
00000000  1    SSET = (NODE,LEVEL1_VAR,SUBR);
00000000  1    PTRTYPE=^S_INT;
00000000  1    PROG_ARRAY=ARRAY[0..MAX_PROG-1] OF PROG_REC;
00000000  1    PROG_ARRAY_PTR=^PROG_ARRAY;
00000000  1
00000000  1    PROGHEAD=RECORD
00000000  2       COUNT:S_INT;
00000000  2       START:PROG_ARRAY_PTR;
00000000  1    END;
00000000  1
00000000  1    LOAD_REC = RECORD
00000000  2       PROG,MIN,MAX:AR2_INT;
00000000  1    END;
00000000  1
00000000  1
00000000  1    DCBREC = RECORD
00000000  2       DCB_PTR:DCBPTR;
00000000  2       DCB_OWNER:S_INT;
00000000  1    END;
00000000  1
00000000  1  VAR
00000000  1
00000000  1  $EXTVAR+$
00000000  1    PROG:PROGHEAD;
00000000  1    DCB:DCBREC;
00000000  1  $EXTVAR-$
00000000  1
00000000  1    INDEX_START:INTEGER;
00000004  1    MAX_INDEX:S_INT;
00000006  1    PROG_ARR:PROG_ARRAY;
0000025E  1    OLD BASE:S_INT;
00000260  1    BASE:S_INT;
00000000  1
00000000  1
00000000  1  PROCEDURE OUTIT(LETTER:CHAR;VALUE:S_INT;BASE:CHAR);EXTERNAL;
00000000  1
00000000  1  PROCEDURE P_OPEN(VAR FNAME:NAME;FTYPE,DISC:S_INT;
00000000  2                  VAR DCB:DCBTYPE; SIZE:S_INT; VAR ERROR:S_INT); EXTERNAL;
00000000  1  PROCEDURE P_POSITION (VAR DCB:DCBTYPE; RECNUM:S_INT; VAR ERROR:S_INT); EXTERNAL;
00000000  1  PROCEDURE P_READ( VAR DCB:DCBTYPE; VAR RBUFF:BUFFTYPE; SIZE:S_INT;
00000000  2                   VAR ERROR:S_INT);  EXTERNAL;
00000000  1  PROCEDURE P_CLOSE( VAR DCB:DCBTYPE; VAR ERROR: S_INT); EXTERNAL;
00000000  1
00000000  1  PROCEDURE IOERROR(VAR ERROR:S_INT; VAR DCB:DCBTYPE); EXTERNAL;
00000000  1
00000000  1  PROCEDURE SYM_ERROR(NO:S_INT; VAR SNAME:NAME); EXTERNAL;
00000000  1
00000000  1  PROCEDURE GET_SYM_SPACE(SIZE,PROGNO,SUBNO:S_INT; SYMTYPE:SSET;
00000000  2                         VAR SYM_ADDR:PTRTYPE); EXTERNAL;
00000000  1
00000000  1  PROCEDURE RELEASE_SYM_SPACE(SYM_ADDR:PTRTYPE);EXTERNAL;
00000000  1
00000000  1  FUNCTION COMPAREIDENT(IDENT1,IDENT2:NAMEPTR):BOOLEAN;EXTERNAL;
00000000  1
00000000  1  FUNCTION COMPAREFILE(VAR FILE1,FILE2:NAME):BOOLEAN;EXTERNAL;
00000000  1
00000000  1
00000000  1
00000000  1  FUNCTION GET_PROGNO(INDEX:S_INT):INTEGER;
00000004  2  (*************************************************************************
00000004  2  THIS FUNCTION RETURNS THE PROGNO BASED UPON THE INDEX OF THE ENTRY IN
00000004  2  THE PROG_ARRAY AND BASE AND OLD_BASE
00000004  2  **************************************************************************)
00000004  2
00000004  2  BEGIN
00000004  2
00000004  2  IF INDEX > PROG.COUNT MOD MAX_PROG
00000020  2     THEN GET_PROGNO:=OLD_BASE+INDEX
00000032  2     ELSE GET_PROGNO:=BASE+INDEX;
00000044  2
00000044  2  END;
```

```
00000000  1
00000000  1
00000000  1
00000000  1  $GLOBPROC+$
00000000  1
00000000  1  PROCEDURE PROG_INIT(FNAME:NAMEPTR; VAR  DISC:S_INT; VAR PROGNO,PROCID,LANG,ERROR:S_INT);
00000000  2  (**********************************************************************
00000000  2  THIS PROCEDURE OPENS THE DATABASE FILE OF FNAME AND PUTS THE FIRST
00000000  2  RECORD (THE PROG_ARRAY RECORD) INTO THE PROG ARRAY.  IF THE FILE
00000000  2  IS NOT FOUND IT RETURNS AN ERROR=3, ELSE ERROR=0
00000000  2  IT ALSO RETURNS THE PROGNO THAT IT PUT THE FILE AT
00000000  2  IF THE FILE IS ALREADY IN THE PROG ARRAY THEN IT RETURNS ITS NUMBER
00000000  2  ALSO RETURNED IS THE PROCESSOR ID AND THE LANGUAGE OF THE DATABASE FILE
00000000  2  IF DISC = -1 THEN THE REAL DISC IS RETURNED
00000000  2  **********************************************************************)
00000000  2  LABEL
00000000  2    10;
00000000  2
00000000  2  CONST
00000000  2    DSIZE = 1;     (* ONLY LOOKING AT FIRST RECORD SO KEEP IT SMALL *)
00000000  2
00000000  2  VAR
00000000  2
00000000  2    DCB:DCBPTR;
00000004  2    RBUF:BUFFPTR;
00000008  2    I:S_INT;
0000000A  2    SERROR:S_INT;
0000000C  2    Q:BUFFPTR;
00000010  2    FOUND:BOOLEAN;
00000011  2    CK_DISC:S_INT;
00000014  2    J:S_INT;
00000050  2
00000050  2  BEGIN
00000050  2
00000050  2  NEW(DCB);
00000060  2  NEW(RBUF);
00000070  2  FOUND:=FALSE;
00000074  2  I:=0;
00000078  2  IF PROG.COUNT <> -1
00000084  2     THEN J:=MAX_INDEX
0000008E  2     ELSE J:=-1;
00000094  2  WITH PROG DO
0000009C  2    WHILE (I <= J) AND (NOT FOUND) DO
000000B8  2       BEGIN   (* LOOK FOR DUPLICATES *)
000000B8  2       IF (COMPAREFILE(START^[I].FNAME,FNAME^))
000000DE  2          THEN
000000DE  2             BEGIN  (* CHECK DISCS *)
000000DE  2             CK_DISC:=SHIFT(SHIFT(START^[I].PROCID_DISC,8),-8);
000000FE  2             IF (DISC = -1) OR (DISC = CK_DISC)  (* CK_DISC CAN'T BE -1 *)
0000011C  2                THEN
0000011C  2                   BEGIN   (* A DUPLICATE ENTRY *)
0000011C  2                   FOUND:=TRUE;
00000122  2                   PROGNO:=GET_PROGNO(I);
00000132  2                   PROCID:=SHIFT(START^[I].PROCID_DISC,-8);
00000152  2                   LANG:=START^[I].LANGUAGE;
0000016E  2                   ERROR:=0;
00000174  2                   DISC:=CK_DISC;
0000017C  2                   END;    (* A DUPLICATE ENTRY *)
0000017C  2             END;  (* CHECK DISCS *)
0000017C  2       I:=I+1;
00000180  2       END;  (* LOOK FOR DUPLICATES *)
00000184  2  IF NOT FOUND
0000018C  2    THEN
0000018C  2       BEGIN  (* ADD THE ENTRY *)
0000018C  2       P_OPEN(FNAME^,SODA_SYM,DISC,DCB^,DSIZE,ERROR);
000001B6  2       IF ERROR = 0
000001C0  2         THEN
000001C0  2            WITH PROG DO
000001C8  2            BEGIN   (* FILE IS OPENED *)
000001C8  2            IF COUNT = -1
000001D2  2               THEN
000001D2  2                  BEGIN  (* INIT THE PROG ARRAY *)
000001D2  2                  BASE:=0;
000001D6  2                  OLD_BASE:=0;
000001DA  2                  COUNT:=0;
```

```
000001F4  2                END    (* INIT THE PROG ARRAY *)
000001F8  2             ELSE
000001F8  2                BEGIN   (* ADD A NEW ENTRY *)
000001F8  2                COUNT:=COUNT+1;
000001FE  2                IF COUNT > SHIFT(MAX_PROG,8)
0000020C  2                   THEN COUNT:=0;
0000020E  2                J:=COUNT MOD MAX_PROG;
00000226  2                IF COUNT-J <> BASE
00000236  2                   THEN
00000236  2                      BEGIN  (* A NEW BASE *)
00000236  2                      OLD_BASE:=BASE;
0000023C  2                      BASE:=COUNT-J;
00000248  2                      END;   (* A NEW BASE *)
00000248  2                IF COUNT < MAX_PROG
00000256  2                   THEN MAX_INDEX:=COUNT
0000025E  2                   ELSE MAX_INDEX:=MAX_PROG-1;
00000264  2                END;      (* ADD A NEW ENTRY *)
00000264  2          Q:=BUFFPTR(ADDR(START^[J]));
0000027C  2          P_READ(DCB^,RBUF^,128,ERROR);
0000029C  2          IF ERROR <> 0 THEN IO_ERROR(ERROR,DCB^);
000002DC  2          IF RBUF^[REVLOC] <> REVNO
000002CC  2             THEN SYNERROR(COMP_DB_INCOMP,FNAME^);
000002E0  2          P_READ(DCB^,RBUF^,128,ERROR);
00000300  2          IF ERROR <> 0 THEN IO_ERROR(ERROR,DCB^);
00000320  2          FOR I:=0 TO SHIFT(SHIFT(RBUF^[0],8),-8)-1 DO
0000033C  2             Q^[I]:=RBUF^[I+1];
0000036A  2          P_CLOSE(DCB^,SERROR);
0000037A  2          PROGNO:=PROG.COUNT;
00000382  2          WITH START^[J] DO
0000039A  2               BEGIN
0000039A  2               PROCID:=SHIFT(PROCID_DISC,-8);
000003A6  2               DISC:=SHIFT(SHIFT(PROCID_DISC,8),-8);
000003B8  2               LANG:=LANGUAGE;
000003C4  2               END;
000003C4  2          END     (*  FILE IS OPENED *)
000003C8  2       ELSE
000003C8  2          IF ERROR = 3
000003D6  2             THEN ERROR:=DB_FILE_NOT_FOUND
000003E2  2             ELSE IO_ERROR(ERROR,DCB^);
000003F8  2      END;             (* ADD THE ENTRY *)
000003F8  2
000003F8  2  10:
000003F8  2      DISPOSE(DCB);
00000408  2      DISPOSE(RBUF);
00000418  2
00000418  2  END;      (* PROG_INIT *)
00000000  1
00000000  1
00000000  1
00000000  1
00000000  1  PROCEDURE PROG_FILE(PROGNO:S_INT; FPTR:NAMEPTR; VAR DISC,ERROR:S_INT);
00000000  2  (**************************************************************************
00000000  2  THIS PROCEDURE COPIES A SOURCE FILE NAME TO AN ARRAY[0..7] POINTED TO BY FPTR AND ITS DISC
00000000  2  GIVEN A PROGRAM NUMBER. IT RETURNS AN ERROR=NOT_FOUND IF THE PROGRAM NUMBER DOES
00000000  2  NOT EXIST
00000000  2  **************************************************************************)
00000000  2
00000000  2
00000000  2  VAR
00000000  2
00000000  2    P:PROG_ARRAY_PTR;
00000004  2    I:S_INT;
00000420  2
00000420  2  BEGIN
00000420  2
00000420  2  P:=PROG.START;
00000426  2  IF PROGNO > PROG.COUNT
00000432  2     THEN ERROR:=NOT_FOUND
0000043E  2     ELSE ERROR:=0;
00000444  2  PROGNO:=PROGNO MOD MAX_PROG;
0000045A  2  WITH P^[PROGNO] DO
0000046A  2    FOR I:=0 TO 7 DO
0000046E  2       FPTR^[I]:=FNAME[I];
0000049C  2  DISC:=SHIFT(SHIFT(P^[PROGNO].PROCID_DISC,8),-8);
```

```
000004BA  2
000004BA  2  END;    (* PROG_FILE *)
00000000  1
00000000  1  FUNCTION PROG_NUM_PROG(PTR:NAMEPTR):S_INT;
00000002  2  (*************************************************************************
00000002  2  THIS FUNCTION RETURNS THE PROGRAM NUMBER OF A PROGRAM NAME POINTED
00000002  2  TO BY PTR IF FOUND ELSE IT RETURNS 0
00000002  2  *************************************************************************)
00000002  2
00000002  2  VAR
00000002  2    I:S_INT;
00000004  2    P:PROG_ARRAY_PTR;
00000008  2    Q:NAMEPTR;
0000000C  2    MAX:S_INT;
0000000E  2    FOUND:BOOLEAN;
000004C2  2
000004C2  2
000004C2  2  BEGIN
000004C2  2
000004C2  2  I:=0;
000004C6  2  P:=PROG.START;
000004CC  2  MAX:=MAX_INDEX;
000004D2  2  FOUND:=FALSE;
000004D6  2  WHILE (NOT FOUND) AND (I <= MAX) DO
000004F2  2    BEGIN    (* LOOKING FOR NAME *)
000004F2  2    Q:=NAMEPTR(ADDR(P^[I].PNAME));
00000506  2    IF COMPAREIDENT(Q,PTR) THEN
0000051A  2       FOUND:=TRUE
00000524  2       ELSE I:=I+1;
00000528  2    END;      (* LOOKING FOR NAME *)
0000052A  2  IF FOUND=TRUE THEN PROG_NUM_PROG:=GET_PROGNO(I)
00000548  2    ELSE PROG_NUM_PROG:=-1;
0000054E  2
0000054E  2  END;            (* PROG_NUM_PROG *)
00000000  1
00000000  1
00000000  1
00000000  1  FUNCTION PROG_NUM_FILE(PTR:NAMEPTR; DISC:S_INT):S_INT;
00000002  2  (*************************************************************************
00000002  2  THIS FUNCTION RETURNS THE PROGRAM NUMBER OF A FILE NAME POINTED
00000002  2  TO BY PTR AND A DISC, IF FOUND ELSE IT RETURNS 0
00000002  2  A -1 DISC IMPLIES ANY DISC
00000002  2  *************************************************************************)
00000002  2
00000002  2  VAR
00000002  2    I:S_INT;
00000004  2    P:PROG_ARRAY_PTR;
00000008  2    MAX:S_INT;
0000000A  2    FOUND:BOOLEAN;
0000000B  2    NO_DISC:BOOLEAN;
0000055C  2
0000055C  2
0000055C  2  BEGIN
0000055C  2
0000055C  2  I:=0;
00000560  2  P:=PROG.START;
00000566  2  MAX:=MAX_INDEX;
0000056C  2  FOUND:=FALSE;
00000570  2  IF DISC=-1
0000057C  2     THEN NO_DISC:=TRUE
00000586  2     ELSE NO_DISC:=FALSE;
0000058A  2  WHILE (NOT FOUND) AND (I <= MAX) DO
000005A6  2    BEGIN    (* LOOKING FOR NAME *)
000005A6  2    IF (NO_DISC) OR (SHIFT(SHIFT(P^[I].PROCID_DISC,-8),8)=DISC)
000005CE  2       THEN
000005CE  2          IF COMPAREFILE(P^[I].FNAME,PTR^)
000005F0  2             THEN FOUND:=TRUE;
000005F6  2    I:=I+1;
000005FA  2    END;    (* LOOKING FOR NAME *)
000005FC  2  IF FOUND=TRUE
00000608  2    THEN PROG_NUM_FILE:=GET_PROGNO(I-1)
0000061E  2    ELSE PROG_NUM_FILE:=-1;
00000624  2
00000624  2  END;        (* PROG_NUM_FILE *)
00000000  1
```

```
00000000  1  (**********************************************************************)
00000000  1  FUNCTION PROG_HEADER(PROGNO:S_INT):PTRTYPE;
00000004  2  (**********************************************************************)
00000004  2  (* THIS FUNCTION RETURNS AN ADDRESS TO THE CORRECT ENTRY IN THE PROGRAM
00000004  2     ARRAY GIVEN A PROGRAM NUMBER.  IT RETURNS 0 IF IT CAN'T BE FOUND *)
00000004  2
00000004  2
00000004  2  VAR
00000004  2    COUNT:S_INT;
00000006  2    P:PROG_ARRAY_PTR;
00000632  2
00000632  2
00000632  2  BEGIN
00000632  2
00000632  2  COUNT:=PROG.COUNT;
00000638  2  P:=PROG.START;
0000063E  2  IF (PROGNO>COUNT) OR (PROGNO<0) THEN
0000065A  2    BEGIN   (* BAD PROGNO *)
0000065A  2    PROG_HEADER:=NIL;
0000065E  2    END     (* BAD PROGNO *)
00000662  2    ELSE
00000662  2       PROG_HEADER:=PTRTYPE(ADDR(P^(PROGNO MOD MAX_PROG]));
00000684  2  END;
00000000  1
00000000  1
00000000  1
00000000  1  PROCEDURE PROG_FNAME(PROGNO:S_INT; VAR FNAME:NAMEPTR; VAR DISC,PROC_ID,ERROR:S_INT);
00000000  2  (************************************************************************
00000000  2    THIS PROCEDURE RETURNS THE FILE INFORMATION CONTAINED IN THE PROG ARRAY
00000000  2  ************************************************************************)
00000000  2  VAR
00000000  2    P:PROG_PTR;
00000690  2
00000690  2  BEGIN
00000690  2
00000690  2  P:=PROG_PTR(PROG_HEADER(PROGNO));
0000069C  2  IF P <> NIL
000006A2  2    THEN
000006A2  2    BEGIN
000006A2  2    PROC_ID:=SHIFT(P^.PROCID_DISC,-8);
000006B2  2    DISC:=SHIFT(SHIFT(P^.PROCID_DISC,8),-8);
000006C4  2    FNAME:=NAMEPTR(ADDR(P^.FNAME));
000006D2  2    ERROR:=0;
000006D8  2    END
000006DC  2    ELSE
000006DC  2      ERROR:=PROG_NOT_FOUND;
000006E4  2
000006E4  2  END;              (* PROG_FNAME *)
00000000  1
00000000  1
00000000  1  PROCEDURE PROG_PNAME(PROGNO:S_INT; PNAME:NAMEPTR; VAR ERROR:S_INT);
00000000  2  (************************************************************************
00000000  2    THIS PROCEDURE RETURNS THE PROGRAM NAME CONTAINED IN THE PROG ARRAY
00000000  2  ************************************************************************)
00000000  2  VAR
00000000  2    P:PROG_PTR;
00000004  2    I:S_INT;
000006EC  2
000006EC  2  BEGIN
000006EC  2
000006EC  2  P:=PROG_PTR(PROG_HEADER(PROGNO));
000006FA  2  IF P <> NIL
00000700  2   THEN
00000700  2      BEGIN
00000700  2      FOR I:=0 TO 7 DO
00000704  2         PNAME^[I]:=P^.PNAME[I];
00000732  2      ERROR:=0;
00000738  2      END
0000073C  2   ELSE
0000073C  2      ERROR:=-1;
00000744  2
00000744  2  END;              (* PROG_PNAME *)
00000000  1
00000000  1  PROCEDURE PROG_ADDR(PROGNO:S_INT; VAR ENTRY,EXIT:AR2_INT; VAR ERROR:S_INT);
```

```
00000000  2  (**************************************************************************
00000000  2    THIS PROCEDURE RETURNS THE ENTRY AND EXIT ADDRESS CONTAINED IN THE PROG ARRAY
00000000  2  **************************************************************************)
00000000  2  VAR
00000000  2    P:PROG_PTR;
0000074C  2
0000074C  2  BEGIN
0000074C  2
0000074C  2  P:=PROG_PTR(PROG_HEADER(PROGNO));
0000075A  2  IF P <> NIL
00000760  2    THEN
00000760  2       BEGIN
00000760  2       ENTRY:= P^.ENTRY;
0000076C  2       EXIT:=P^.EXIT;
00000778  2       ERROR:=0;
0000077E  2       END
00000782  2    ELSE
00000782  2       ERROR:=-1;
0000078A  2
0000078A  2  END;               (* PROG_PNAME *)
00000000  1
00000000  1  PROCEDURE PROG_LOAD(PROGNO:S_INT; VAR LOAD:LOAD_REC; VAR ERROR:S_INT);
00000000  2  (**************************************************************************
00000000  2    THIS PROCEDURE RETURNS THE LOAD ADDRESSES CONTAINED IN THE PROG ARRAY
00000000  2  **************************************************************************)
00000000  2  VAR
00000000  2    P:PROG_PTR;
00000792  2
00000792  2  BEGIN
00000792  2
00000792  2  P:=PROG_PTR(PROG_HEADER(PROGNO));
000007A0  2  IF P <> NIL
000007A6  2    THEN
000007A6  2       BEGIN
000007A6  2       LOAD.PROG:=P^.PROG_LOAD;
000007B2  2       LOAD.MIN:=P^.MIN;
000007C0  2       LOAD.MAX:=P^.MAX;
000007CE  2       ERROR:=0;
000007D4  2       END
000007D8  2    ELSE
000007D8  2       ERROR:=-1;
000007E0  2
000007E0  2  END;               (* PROG_PNAME *)
00000000  1
00000000  1
00000000  1  (**********************************************************************)
00000000  1  PROCEDURE LOAD_SYM_REC(LOAD:PTRTYPE; PROGNO,RECNUMS,RECSTART:S_INT;
00000000  2                       VAR SIZE:S_INT; DCB:DCBPTR;
00000000  2                       VAR ERROR:S_INT);
00000000  2  (**********************************************************************)
00000000  2  (* THIS PROCEDURE LOADS RECNUMS OF SYMBOLS RECORDS AT THE ADDRESS
00000000  2     POINTED TO BY LOAD, STARTING AT RECORD NUMBER RECSTART OF THE SYMBOL
00000000  2     FILE OF PROGRAM PROGNO. IT RETURNS AN ERROR IF IT CAN'T LOAD AND
00000000  2     IF IT CAN THEN IT PUTS THE NUMBER OF WORDS LOADED IN SIZE *)
00000000  2
00000000  2  LABEL
00000000  2     10;
00000000  2
00000000  2  VAR
00000000  2    LOAD_LOC:GEN_TYPE;
00000004  2    RBUFF:BUFFPTR;
00000008  2    P:PTRTYPE;
0000000C  2    I,J,COUNT:S_INT;
000007E8  2
000007E8  2  BEGIN
000007E8  2
000007E8  2
000007E8  2  ERROR:=0;
000007EE  2  SIZE:=0;
000007F4  2  LOAD_LOC.I:=INTEGER(LOAD);
000007FA  2  NEW(RBUFF);
0000080A  2  P POSITION(DCB^,RECSTART,ERROR);
```

```
00000824  2  IF ERROR <> 0 THEN IO_ERROR(ERROR,DCB^);
00000844  2  FOR I:=1 TO RECNUMS DO
0000085A  2    BEGIN            (* READING THE RECS IN *)
0000085A  2    P_READ(DCB^,RBUFF^,128,ERROR);
0000087A  2    IF ERROR <> 0 THEN IO_ERROR(ERROR,DCB^);
0000089A  2    COUNT:=SHIFT(SHIFT(RBUFF^[0],8),-8);
000008A8  2    SIZE:=SIZE+COUNT;
000008AE  2    FOR J:=1 TO COUNT DO
000008C4  2       BEGIN       (* MOVE A REC *)
000008C4  2       LOAD_LOC.P^:=RBUFF^[J];
000008D6  2       LOAD_LOC.I:=LOAD_LOC.I+2;
000008DA  2       END;         (* MOVE A REC *)
000008EC  2    END;               (* READING THE RECS IN *)
00000900  2  10:
00000900  2    DISPOSE(RBUFF);
00000910  2
00000910  2  END;
00000000  1
00000000  1
00000000  1  (**********************************************************************)
00000000  1  FUNCTION NODE_HEADER(PROGNO:S_INT):PTRTYPE;
00000000  2  (**********************************************************************)
00000000  2  (* THIS PROCEDURE RETURNS THE ADDRESS TO THE NODE RECORD OF A PROGRAM FILE
00000000  2     GIVEN THE PROGRAM NUMBER.  IT BRINGS THE NODE IN MEMORY IF IT IS NOT
00000000  2     THERE  *)
00000000  2  LABEL
00000000  2    10;
00000004  2
00000004  2  VAR
00000004  2    Q,P:PROG_PTR;
0000000C  2    SIZE,WORDS:S_INT;
00000010  2    ADDRESS:PTRTYPE;
00000014  2    ERROR:S_INT;
00000016  2    RECSIZE:S_INT;
00000018  2    FNAME:NAMEPTR;
0000001C  2    DISC,PROCID:S_INT;
00000020  2    OLDPROGNUM:S_INT;
00000022  2    I,BIT:S_INT;
00000918  2
00000918  2
00000918  2  BEGIN
00000918  2
00000918  2  NODE_HEADER:=NIL;
0000091C  2  Q:=PROG_PTR(PROG_HEADER(PROGNO));
0000092A  2  IF Q=NIL THEN NODE_HEADER:=NIL
00000938  2    ELSE
00000938  2    IF Q^.NODE_PTR=S_UNS(0) THEN
00000944  2    BEGIN            (* BLOCK NODE IS OUT ON DISC *)
00000944  2    INDEX_START:=0;  (* INITIALIZE IT FOR SUB_INDEX *)
00000948  2    SIZE:=Q^.NODE_SIZE;
00000950  2    OLDPROGNUM:=DCB.DCB_OWNER;
00000956  2    IF (OLDPROGNUM <> -1)
00000962  2       THEN
00000962  2          BEGIN   (* GET RID OF OLD NODE INDEX *)
00000962  2          P:=PROG_PTR(PROG_HEADER(OLDPROGNUM));
0000096E  2          IF P <> NIL
00000974  2             THEN
00000974  2                BEGIN   (* A REAL OWNER *)
00000974  2                RELEASE_SYM_SPACE(PTRTYPE(INTEGER(P^.NODE_PTR)));
00000986  2                P^.NODE_PTR:=S_UNS(0);
0000098E  2                P_CLOSE(DCB.DCB_PTR^,ERROR);
0000099E  2                END;    (* A REAL OWNER *)
0000099E  2          END;   (* GET RID OF OLD NODE INDEX *)
0000099E  2      PROG_FNAME(PROGNO,FNAME,DISC,PROCID,ERROR);
000009BC  2      DCB.DCB_OWNER:=PROGNO;
000009C2  2      P_OPEN(FNAME^,SODA_SYM,DISC,DCB.DCB_PTR^,DCBSIZE,ERROR);
000009E3  2      IF ERROR <> 0 THEN IO_ERROR(ERROR,DCB.DCB_PTR^);
00000A03  2      GET_SYM_SPACE(SIZE,PROGNO,0,NODE,ADDRESS);
00000A1E  2      IF SIZE MOD 128 = 0 THEN RECSIZE:=SIZE DIV 128
00000A48  2         ELSE RECSIZE:= SIZE DIV 128 +1;
00000A58  2      LOAD_SYM_REC(ADDRESS,PROGNO,RECSIZE,3,WORDS,DCB.DCB_PTR,ERROR);
00000A7E  2      IF ERROR <> 0 THEN NODE_HEADER:=NIL
00000A8E  2         ELSE
00000A8E  2         BEGIN     (* IN MEMORY *)
```

```
00000A8E 2        Q^.NODE_PTR:=S_UMS(INTEGER(ADDRESS));
00000A9A 2        NODE_HEADER:=ADDRESS;
00000AA0 2        END;      (* IN MEMORY *)
00000AA0 2   END            (* BLOCK NODE IS OUT ON DISC *)
00000AA4 2   ELSE     (* NODE IS IN MEMORY *)
00000AA4 2      BEGIN
00000AA4 2      NODE_HEADER:=PTRTYPE(INTEGER(Q^.NODE_PTR));
00000AB2 2      END;
00000AB2 2
00000AB2 2 10:
00000AB2 2
00000AB2 2 END;
00000000 1
00000000 1
00000000 1 (*****************************************************************)
00000000 1 FUNCTION SUB_INDEX(PROGNO,SUBNO:S_INT; VAR NEXT_SUB:S_INT):PTRTYPE;
00000000 2 (*****************************************************************
00000000 2   THIS FUNCTION RETURNS THE ENTRY ADDRESS OF A PROC ENTRY INTO
00000000 2   THE NODE TABLE.  IT MATCHES SUBROUTINE NUMBERS UNTIL THE
00000000 2   ENTRY IS FOUND OR THE NODE HAS BEEN COMPLETELY REACHED.
00000000 2   IF IT CAN'T BE FOUND THEN ZERO IS RETURNED
00000000 2 ******************************************************************)
00000000 2 CONST
00000000 2   NODE_START = 8;
00000004 2
00000004 2
00000004 2 VAR
00000004 2   INDEX:GEN_TYPE;
00000008 2   END_ADDR:INTEGER;
0000000C 2   FOUND,DONE:BOOLEAN;
0000000E 2   START:INTEGER;
00000ABE 2
00000ABE 2 BEGIN
00000ABE 2
00000ABE 2 FOUND:=FALSE;
00000AC2 2 INDEX.P:=NODE_HEADER(PROGNO);
00000AD0 2 IF INDEX.I <> 0
00000AD6 2   THEN
00000AD6 2      BEGIN  (* WE HAVE A NODE *)
00000AD6 2      END_ADDR:=INDEX.I+(INDEX.P^*2);
00000AE6 2      START:=INDEX.I+NODE_START;
00000AF0 2      IF INDEX_START <> 0
00000AF8 2         THEN INDEX.I:=INDEX_START
00000B02 2         ELSE
00000B02 2            BEGIN  (* FIRST TIME THROUGH *)
00000B02 2            INDEX.I:=START;
00000B08 2            INDEX_START:=START;
00000B0E 2            END;  (* FIRST TIME THROUGH *)
00000B0E 2      DONE:=FALSE;
00000B12 2      IF INDEX.I < END_ADDR
00000B1E 2         THEN NEXT_SUB:=SHIFT(INDEX.P^,-8)
00000B30 2         ELSE NEXT_SUB:=0;
00000B36 2      END   (* WE HAVE A NODE *)
00000B3A 2   ELSE DONE:=TRUE;
00000B40 2
00000B40 2 IF SUBNO = 0
00000B48 2    THEN DONE:=TRUE;  (* WE WILL NEVER FIND 0 BUT WE INITIALIZED NEXT_SUB *)
00000B4E 2
00000B4E 2 WHILE NOT DONE DO
00000B56 2   BEGIN  (* LOOKING *)
00000B56 2   IF NEXT_SUB = SUBNO
00000B64 2      THEN
00000B64 2         BEGIN   (* FOUND IT *)
00000B64 2         FOUND:=TRUE;
00000B6A 2         DONE:=TRUE;
00000B70 2         SUB_INDEX:=INDEX.P;
00000B76 2         INDEX_START:=INDEX.I;
00000B7C 2         END;    (* FOUND IT *)
00000B7C 2   INDEX.I:=INDEX.I+SHIFT(SHIFT(INDEX.P^,8),-7);
00000B8C 2   IF INDEX.I >= END_ADDR
00000B98 2      THEN INDEX.I:=START;
00000B9E 2   IF INDEX.I = INDEX_START
00000BAA 2      THEN DONE:=TRUE;
00000BB0 2   NEXT_SUB:=SHIFT(INDEX.P^,-8);
00000BBE 2   END;    (* LOOKING *)
```

```
00000BC0  2
00000BC0  2  IF NOT FOUND THEN SUB_INDEX:=NIL;
00000BCC  2
00000BCC  2  END;     (* SUB_INDEX *)
00000000  1  .

****WARNING ?? - Symbol: LABEL_10, is duplicated in the asmb_syn file.
****WARNING ?? - Symbol: LABEL_10, is duplicated in the asmb_syn file.

End of compilation, number of errors=    0


00000000  1  "68000" PREPROCESS
00000000  1  $EXTENSIONS ON$
00000000  1  PROGRAM FIND_SYMBOL;
00000000  1  CONST
00000000  1    RECSIZE=128;
00000000  1    PROGLEN = 30;
00000000  1
00000000  1  #INCLUDE ERROR:INCLUD
00000000  1  #INCLUDE STD_DATA:SODADB
00000000  1  #INCLUDE SYMBOL:SODADB
00000000  1
00000000  1  #DEFINE VIRTUALINC(P,OFFSET)  BEGIN                \
00000000  1                                VIRTUAL_INC(P,OFFSET,ERROR);\
00000000  1                                IF ERROR <> 0 THEN GOTO 10;\
00000000  1                                END
00000000  1
00000000  1  TYPE
00000000  1
00000000  1
00000000  1    PTR_ARRAY = ARRAY[0..10] OF PATHPTR;
00000000  1
00000000  1    SYM_TYPES = (NODE,LEVEL1_VAR,SUBR);
00000000  1
00000000  1
00000000  1
00000000  1  FUNCTION SUB_INDEX(PROGNO,SUBNO:S_INT; VAR NEXTSUB:S_INT):POINTER;EXTERNAL;
00000000  1
00000000  1  FUNCTION PROG_NUM_PROG(NEXT_SYM:NAMEPTR):S_INT;EXTERNAL;
00000000  1
00000000  1  FUNCTION PROG_HEADER(PNUM:S_INT):POINTER;EXTERNAL;
00000000  1
00000000  1
00000000  1  FUNCTION NODE_HEADER(PROGNO:S_INT):POINTER;EXTERNAL;
00000000  1
00000000  1
00000000  1  PROCEDURE GET_SYM(PTR,SYMPTR:POINTER; FLAG:BOOLEAN; VAR TYPES:SYMSET; VAR LENGTH,ERROR:S_INT);EXTERNAL;
00000000  1
00000000  1  PROCEDURE RELEASE_SYM_SPACE(ADDRESS:POINTER);EXTERNAL;
00000000  1
00000000  1  PROCEDURE PROC_INFO(PNUM,SUBNO:S_INT; VAR ADDRESS:POINTER; VAR ERROR:S_INT);EXTERNAL;
00000000  1
00000000  1  PROCEDURE VIRTUAL_INC(VAR PTR:POINTER; VALUE:S_INT; VAR ERROR:S_INT);EXTERNAL;
00000000  1
00000000  1  PROCEDURE LEVEL1VAR(PROGNO:S_INT; VAR ADDRESS:POINTER; VAR ERROR:S_INT);EXTERNAL;
00000000  1
00000000  1  FUNCTION COMPAREIDENT(NAME1,NAME2:NAMEPTR):BOOLEAN;EXTERNAL;
00000000  1
00000000  1  PROCEDURE OUTIT(LETTER:CHAR; VUE:S_INT; BASE:CHAR);EXTERNAL;
00000000  1
00000000  1
00000000  1  PROCEDURE INC_POINTER(VAR PTR:POINTER; VALUE:S_INT);
00000004  2  (**************************************************************************
00000004  2  THIS PROCEDURE ADDS VALUE*2 TO PTR AND PUTS THE RESULT IN PTR;
00000004  2  IE. VALUE IS THE NUMBER OF WORDS TO ADVANCE THE POINTER AND
00000004  2  IT GETS CONVERTED TO NUMBER OF BYTES
00000004  2  **************************************************************************)
00000004  2
00000004  2  BEGIN
00000004  2
```

```
00000004  2  PTR:=POINTER(INTEGER(PTR)+VALUE*2);
0000001A  2
0000001A  2  END;
00000000  1
00000000  1
00000000  1
00000000  1  $GLOBPROC+$
00000000  1
00000000  1
00000000  1
00000000  1  FUNCTION PROC_NUM(PROGNO:S_INT; NPTR:NAMEPTR; VAR ERROR:S_INT):S_INT;
00000000  2  (*************************************************************************
00000000  2    THIS FUNCTION RETURNS THE SUBNO OF A PROCEDURE GIVEN ITS NAME
00000000  2    POINTED TO BY NPTR.
00000000  2    IF IT FINDS MORE THAN ONE PROCEDURE WITH THE SAME NAME THEN
00000000  2    IT RETURNS AND ERROR =-4;
00000000  2    IF IT DOES NOT FIND THE PROCEDURE THEN THE FUNCTION VALUE IS SET TO ZERO
00000000  2    IT RETURNS ERROR =-5 IF A BAD LENGTH IS FOUND IN THE DATABASE
00000000  2  *************************************************************************)
00000000  2
00000000  2
00000000  2  CONST
00000000  2    NODE_START = 4;
00000002  2
00000002  2  VAR
00000002  2    P:POINTER;
00000006  2    Q:NODE_PTR;
0000000A  2    LEN:S_INT;
0000000C  2    NODE_END:INTEGER;
00000010  2    FIRST_TIME:BOOLEAN;
00000011  2    NODE_SIZE:S_INT;
00000014  2    INDEX:S_INT;
00000022  2
00000022  2
00000022  2  BEGIN
00000022  2
00000022  2  ERROR:=0;
00000028  2  FIRST_TIME:=TRUE;
0000002E  2  P:=POINTER(NODE_HEADER(PROGNO));
0000003C  2  NODE_SIZE:=P^;
00000044  2  NODE_END:=INTEGER(P)+NODE_SIZE*2;
00000052  2  INC_POINTER(P,NODE_START);
0000005E  2  Q:=NODE_PTR(P);
00000064  2  WHILE (INTEGER(Q) < NODE_END) AND (ERROR = 0) DO
00000084  2    BEGIN       (* LOOKING DOWN THE INDEX  *)
00000084  2    LEN:=SHIFT(SHIFT(Q^.SUBNO_SIZE,8),-8);
00000092  2    IF  LEN > 15 THEN
0000009A  2        BEGIN   (* ERROR CONDITION *)
0000009A  2        PROC_NUM:=0;
0000009E  2        ERROR:= BAD_DB;
000000A6  2        END
000000AA  2    ELSE
000000AA  2      BEGIN (* VALID LENGTH *)
000000AA  2      IF  COMPAREIDENT(NAMEPTR(ADDR(Q^.PROC_NAME)),NPTR)
000000C4  2        THEN
000000C4  2          BEGIN   (* WE FOUND IT *)
000000C4  2          IF NOT FIRST_TIME
000000CC  2            THEN ERROR:=DUP_PROCS
000000D8  2            ELSE PROC_NUM:=SHIFT(Q^.SUBNO_SIZE,-8);
000000E4  2          FIRST_TIME:=FALSE;
000000E8  2          END;    (* WE FOUND IT *)
000000E8  2      INC_POINTER(POINTER(Q),LEN);
000000F6  2      END;  (* VALID LENGTH *)
000000F6  2    END;          (* LOOKING DOWN THE INDEX *)
000000FA  2
000000FA  2  IF FIRST_TIME THEN PROC_NUM:=0;  (* DID NOT FIND THE PROC NAME *)
00000106  2
00000106  2  END;                   (* PROC_NUM *)
00000000  1
00000000  1
00000000  1
00000000  1  FUNCTION COMPARE(VAR P:POINTER; NPTR:NAMEPTR; VAR INDEX,ERROR:S_INT):BOOLEAN:
00000000  2  (*************************************************************************
00000000  2    THIS FUNCTION RETURNS TRUE IF THE STANDARD IDENITIER (LENGTH IN
```

```
00000000  2    WORDS IN THE -1 IN FIRST 3 BITS) POINTED TO BY NPTR IS THE SAME
00000000  2    AS THAT POINTED TO BY P
00000000  2    IT ASSUMES A VIRTUAL RBUF IS BEING USED AND RETURNS HOW FAR IT
00000000  2    HAD TO SEARCH
00000000  2  ***************************************************************************)
00000000  2  LABEL
00000000  2    10;
00000000  2
00000000  2  CONST
00000000  2    BLANK = 20H;
00000001  2
00000001  2  VAR
00000001  2    LENGTH,I:S_INT;
00000006  2    LEN:S_INT;
00000008  2    FOUND:BOOLEAN;
00000009  2    FIRST_CHAR:S_INT;
00000114  2
00000114  2  BEGIN
00000114  2
00000114  2
00000114  2  INDEX:=0;
0000011A  2  LENGTH:=SHIFT(NPTR^[0],-13);
0000012A  2  LEN:=SHIFT(P^,-13);
00000138  2  IF (LENGTH = LEN)
0000013E  2    THEN
0000013E  2      BEGIN   (* LENGTHS MATCH *)
0000013E  2      FOUND:=TRUE;
00000144  2      I:=0;
00000148  2      FIRST_CHAR:=SHIFT(SHIFT(NPTR^[0],8),-8);
00000152  2      IF FIRST_CHAR <> SHIFT(SHIFT(P^,8),-8)
00000164  2        THEN FOUND:=FALSE
0000016C  2        ELSE
0000016C  2          WHILE (I < LEN) AND (FOUND) DO
00000182  2            BEGIN   (* COMPARING *)
00000182  2            VIRTUALINC(POINTER(P),1);
000001AA  2            I:=I+1;
000001AE  2            IF NPTR^[I] <> P^
000001C8  2              THEN
000001C8  2                FOUND:=FALSE;
000001CC  2            END;  (* COMPARING *)
000001CE  2      INDEX:=I;
000001D6  2      END    (* LENGTHS MATCH *)
000001DA  2    ELSE FOUND:=FALSE;
000001DE  2
000001DE  2  10:
000001DE  2
000001DE  2  COMPARE:=FOUND;
000001E4  2
000001E4  2  END;   (* COMPARE *)
00000000  1
00000000  1  FUNCTION PARM_ADDR(PROGNO,SUBNO:S_INT; NPTR:NAMEPTR; VAR ADDRESS:POINTER; VAR ERROR:S_INT):POINTER;
00000000  2  (***************************************************************************
00000000  2    THIS FUNCTION RETURNS THE ADDRESS OF A PARAMETER SYMBOL
00000000  2    WITHIN A GIVEN SUBNO, WERE NPTR POINTS THE THE NAME OF THE SYMBOL.
00000000  2    A ZERO IS RETURNED IF THE SYMBOL CAN'T BE FOUND
00000000  2  ***************************************************************************)
00000000  2  LABEL
00000000  2    10;
00000000  2
00000000  2
00000000  2  CONST
00000000  2    RECSIZE = 128;
00000000  2    PARM_OFFSET = 3;        (* OFFSET FROM START OF PROC REC TO PARM OFFSET *)
00000000  2    PARM_INFO = 9;          (* NUMBER OF NON_NAME WORDS IN PARM REC *)
00000004  2
00000004  2  VAR
00000004  2    FOUND:BOOLEAN;
00000005  2    P:POINTER;
0000000A  2    LEN,S_TYPE:S_INT;
0000000E  2    OFFSET:S_INT;
00000010  2    INDEX:S_INT;
000001F2  2
000001F2  2
000001F2  2  BEGIN
000001F2  2
```

```
000001F2  2  IF SUBNO=0 THEN
000001FA  2    BEGIN    (* CAN'T BE A PARM WITHOUT A SUB *)
000001FA  2    PARM_ADDR:=NIL;
000001FE  2    GOTO 10;
00000202  2    END;       (* WITHOUT A SUB *)
00000202  2  FOUND:=FALSE;
00000206  2  PROC_INFO(PROGNO,SUBNO,ADDRESS,ERROR);
00000224  2  IF ERROR <> 0 THEN
0000022E  2    BEGIN   (* NO VALID PROC *)
0000022E  2    PARM_ADDR:=NIL;
00000232  2    GOTO 10;
00000236  2    END;     (* NO VALID PROC *)
00000236  2
00000236  2  P:=POINTER(INTEGER(ADDRESS));
0000023E  2  VIRTUALINC(P,PARM_OFFSET);
00000264  2  OFFSET:=P^;
0000026C  2  VIRTUALINC(P,P^);
00000294  2  WHILE (OFFSET <> 0) AND (NOT FOUND) DO
000002AC  2    BEGIN  (* LOOKING FOR SYMBOL *)
000002AC  2    LEN:=SHIFT(P^,-8)-PARM_INFO;
000002BC  2    VIRTUALINC(P,PARM_INFO);
000002E2  2    FOUND:=COMPARE(P,NPTR,INDEX,ERROR);
00000302  2    IF ERROR <> 0 THEN GOTO 10;
00000310  2    IF FOUND
00000318  2      THEN
00000318  2        BEGIN
00000318  2        VIRTUALINC(P,-(INDEX+PARM_INFO));
00000346  2        PARM_ADDR:=P;
0000034C  2        END
00000350  2      ELSE
00000350  2        BEGIN    (* KEEP LOOKING *)
00000350  2        VIRTUALINC(P,-(INDEX+3));
0000037C  2        OFFSET:=P^;
00000384  2        VIRTUALINC(P,OFFSET);
000003AA  2        END;      (* KEEP LOOKING *)
000003AA  2    END;   (* LOOKING FOR SYMBOL *)
000003AE  2  10:
000003AE  2  IF NOT FOUND THEN PARM_ADDR:=NIL;
000003BA  2
000003BA  2  END;    (* PARM_ADDR *)
00000000  1
00000000  1  FUNCTION SYM_ADDR(PROGNO,SUBNO:S_INT; NPTR:NAMEPTR; VAR ADDRESS:POINTER; VAR ERROR:S_INT):POINTER;
00000000  2  (*****************************************************************************
00000000  2    THIS FUNCTION RETURNS THE ADDRESS OF EITHER A VAR OR EXT PROC SYMBOL
00000000  2    WITHIN A GIVEN SUBNO, WERE NPTR POINTS THE THE NAME OF THE SYMBOL.
00000000  2    A ZERO IS RETURNED IF THE SYMBOL CAN'T BE FOUND
00000000  2  *****************************************************************************)
00000000  2  LABEL
00000000  2    10;
00000000  2
00000000  2
00000000  2  CONST
00000000  2    RECSIZE = 128;
00000000  2    VAR_OFFSET = 5;         (* OFFSET FROM START OF PROC REC TO VAR OFFSET *)
00000000  2    VAR_INFO = 9;           (* NUMBER OF NON_NAME WORDS IN VAR REC *)
00000000  2    EXT_INFO = 5;           (* NUMBER OF NON_NAME WORDS IN EXT SUBR REC *)
00000004  2
00000004  2  VAR
00000004  2    FOUND:BOOLEAN;
00000005  2    P:POINTER;
0000000A  2    LEN,S_TYPE:S_INT;
0000000E  2    OFFSET:S_INT;
00000010  2    INDEX:S_INT;
000003C6  2
000003C6  2
000003C6  2  BEGIN
000003C6  2
000003C6  2  FOUND:=FALSE;
000003CA  2  IF  SUBNO=0 THEN
000003D2  2    LEVEL1VAR(PROGNO,ADDRESS,ERROR)
000003F0  2    ELSE
000003F0  2      PROC_INFO(PROGNO,SUBNO,ADDRESS,ERROR);
0000040E  2
0000040E  2  IF ERROR <> 0 THEN
00000418  2    BEGIN   (* NO STARTING POINT *)
```

```
00000418  2     SYM_ADDR:=NIL;
0000041C  2     GOTO 10;
00000420  2     END;    (* NO STARTING POINT *)
00000420  2
00000420  2  IF SUBNO <> 0 THEN
00000428  2    BEGIN   (* SYM IS PART OF A PROC *)
00000428  2    P:=POINTER(INTEGER(ADDRESS));
00000430  2    VIRTUALINC(P,VAR_OFFSET);
00000456  2    OFFSET:=P^;
0000045E  2    VIRTUALINC(P,P^);
00000486  2    END      (* SYM IS PART OF A PROC *)
0000048A  2    ELSE
0000048A  2      BEGIN
0000048A  2      P:=POINTER(INTEGER(ADDRESS));      (* SYM IS LEVEL1 VAR *)
00000492  2      OFFSET:=1;
00000498  2      END;
00000498  2  WHILE (OFFSET <> 0) AND (NOT FOUND) DO
000004B0  2    BEGIN  (* LOOKING FOR SYMBOL *)
000004B0  2    S_TYPE:=SHIFT(SHIFT(P^,3),-8);
000004BE  2    IF S_TYPE=15 THEN
000004C6  2      BEGIN    (* EXTERNAL PROC *)
000004C6  2      LEN:=SHIFT(P^,-8) - EXT_INFO;
000004D4  2      VIRTUALINC(P,EXT_INFO);
000004FA  2      END      (* EXTERNAL PROC *)
000004FE  2      ELSE
000004FE  2        BEGIN  (* VAR  *)
000004FE  2        LEN:=SHIFT(P^,-8) - VAR_INFO;
0000050E  2        VIRTUALINC(P,VAR_INFO);
00000534  2        END;   (* VAR *)
00000534  2    FOUND:=COMPARE(P,NPTR,INDEX,ERROR);
00000554  2    IF ERROR <> 0 THEN GOTO 10;
00000562  2    IF FOUND
0000056A  2      THEN
0000056A  2        BEGIN
0000056A  2        IF S_TYPE=15
00000576  2          THEN VIRTUALINC(P,-(INDEX+EXT_INFO))
000005A6  2          ELSE VIRTUALINC(P,-(INDEX+VAR_INFO));
000005D4  2        SYM_ADDR:=P;
000005DA  2        END
000005DE  2      ELSE
000005DE  2        BEGIN    (* KEEP LOOKING *)
000005DE  2        IF S_TYPE = 15
000005EA  2          THEN VIRTUALINC(P,-(INDEX+1))
0000061A  2          ELSE VIRTUALINC(P,-(INDEX+3));
00000646  2        OFFSET:=P^;
0000064E  2        VIRTUALINC(P,OFFSET);
00000674  2        END;     (* KEEP LOOKING *)
00000674  2    END;   (* LOOKING FOR SYMBOL *)
00000678  2
00000678  2  10:
00000678  2  IF (NOT FOUND)
00000680  2    THEN
00000680  2      SYM_ADDR:=NIL;
00000684  2
00000684  2  END;    (* SYM_ADDR *)
00000000  1
00000000  1
00000000  1  PROCEDURE FIND_SYM(SPTR:PATHPTR; PTR:POINTER; VAR SYMTYPE:SYMSET; VAR LENGTH,ERROR:S_INT);
00000000  2  (***********************************************************************
00000000  2   THIS PROCEDURE PUTS THE SYMBOL AT THE ADDRESS (IN PTR) UP TO LENGTH.
00000000  2   GIVEN A POINTER TO THE PATH NAME (SPTR). IT ALSO RETURNS THE FOLLOWING
00000000  2   ERRORS:
00000000  2      0-NO ERROR
00000000  2     -3-SYMBOL NOT FOUND
00000000  2     -1-PROGRAM NAME NOT FOUND
00000000  2     -2-BAD PATH NAME
00000000  2     -4-DUPLICATE PROCEDURE NAMES
00000000  2     -5-OUT OF AVAILABLE SPACE
00000000  2   IT ALSO RETURNS THE THE TYPE OF THE SYMBOL INTO ONE OF THE FOLLOWING
00000000  2      SYMSET = (PROG,PROC,FUNC,VARIABLE,CONSTANT,PARM,EXTSUBR)
00000000  2   LENGTH ON INPUT IS THE NUMBER OF AVAILABLE WORDS FOR THE SYMBOL AND
00000000  2   ON OUTPUT IT IS THE NUMBER OF WORDS USED.
00000000  2
00000000  2   THIS PROCEDURE USES A SHORT PATH NAME FOR INPUT.  A PATH NAME IS A
00000000  2   WAY TO UNIQUELY IDENTIFY THE SYMBOL. IT CONSISTS OF THE SYMBOL NAME
```

```
00000000  2     FOLLOWED BY THE PROCEDURE NUMBER ITS DECLARED IN, FOLLOWED BY THE
00000000  2     PROGRAM NUMBER THE PROCEDURE IS DECLARED IN.
00000000  2     THIS PROCEDURE ASSUMES THAT THERE ARE NO TWO PROCEDURES DECLARED IN
00000000  2     THE PROGRAM WITH THE SAME NAME.
00000000  2     IT WILL RETURN AN ERROR CODE IF
00000000  2     IT DETECTS TWO PROCEDURES WITH THE SAME NAME.
00000000  2
00000000  2     FOR SYSTEMS THAT DO NOT HAVE THIS LIMITATION ANOTHER FIND_SYM WAS
00000000  2     CREATED AND IS IN THE FILE DB_ACCESS:KAREN.  THIS PROCEDURE REQUIRES
00000000  2     THE NAME OF EVERY PROCEDURE THAT IS SCOPED TO A GIVEN SYMBOL.
00000000  2
00000000  2  *****************************************************************************)
00000000  2
00000000  2
00000000  2  VAR
00000000  2    SYMPTR:POINTER;
00000004  2    PNUM,SUBNO:S_INT;
00000008  2    ADDRESS:POINTER;
0000000C  2    P:POINTER;
00000010  2    Q:BUFFPTR;
00000014  2    SERROR:S_INT;
00000016  2    I:S_INT;
00000000  2
00000000  2         PROCEDURE SYMBOL(SUBNO:S_INT; VAR ERROR:S_INT);
00000690  3
00000690  3             BEGIN   (* NAME IS A SYMBOL *)
00000690  3             SYMPTR:=SYM_ADDR(PNUM,SUBNO,NAMEPTR(SPTR),ADDRESS,ERROR);
000006BC  3             IF (SYMPTR=NIL) AND (SUBNO <> 0) AND (ERROR = 0)
000006E4  3                THEN
000006E4  3                   BEGIN   (* LOOK FOR A PARMETER *)
000006E4  3                   RELEASE_SYM_SPACE(ADDRESS);
000006EE  3                   SYMPTR:=PARM_ADDR(PNUM,SUBNO,NAMEPTR(SPTR),ADDRESS,ERROR);
0000071A  3                   END;      (* LOOK FOR A PARMETER *)
0000071A  3             IF (SYMPTR=NIL) AND (ERROR = 0) THEN ERROR:=NOT_FOUND;
00000742  3             END;    (* NAME IS A SYMBOL *)
0000074A  2
0000074A  2
0000074A  2  BEGIN
0000074A  2
0000074A  2  SYMTYPE:=PROC;
00000752  2  ERROR:=0;
00000758  2  PNUM:=SPTR^.PROGNO;
00000762  2  SUBNO:=SPTR^.SUBNO;
00000768  2  IF PROG_NUM_PROG(NAMEPTR(SPTR))=PNUM
0000077A  2    THEN
0000077A  2     BEGIN  (* NAME IS A PROGRAM NAME *)
0000077A  2     SYMPTR:=PROG_HEADER(PNUM);
00000798  2     SYMTYPE:=PROGR;
0000079E  2     IF PROGLEN > LENGTH
0000079C  2        THEN ERROR:=OUT_OF_SPACE
000007A8  2        ELSE
000007A8  2           BEGIN   (* GET PROGRAM *)
000007A8  2           LENGTH:=PROGLEN;
000007B0  2           P:=POINTER(PTR);
000007B6  2           Q:=BUFFPTR(SYMPTR);
000007BC  2           FOR I:=0 TO PROGLEN-1 DO
000007C0  2              BEGIN (* COPY PROG REC TO PTR *)
000007C0  2              P^:=Q^[I];
000007D2  2              INC_POINTER(P,1);
000007E0  2              END;  (* COPY PROG REC TO PTR *)
000007F0  2           END;  (* GET PROGRAM *)
000007F0  2     END    (* NAME IS A PROGRAM NAME *)
000007F4  2    ELSE
000007F4  2     IF SUBNO=0
000007FC  2        THEN
000007FC  2          BEGIN        (* NAME IS PROC OR LEVEL 1 VAR *)
000007FC  2          SUBNO:=PROC_NUM(PNUM,NAMEPTR(SPTR),ERROR);
00000818  2          IF  SUBNO = 0
00000820  2             THEN  SYMBOL(0,ERROR)
0000083A  2             ELSE
0000083A  2             BEGIN (* MAIN SYMBOL IS A PROCEDURE  *)
0000083A  2             PROC_INFO(PNUM,SUBNO,ADDRESS,SERROR);
00000854  2             SYMPTR:=ADDRESS;
0000085A  2             IF SERROR <> 0 THEN ERROR:=NOT_FOUND;
0000086A  2             END    (* MAIN SYMBOL IS A PROCEDURE *)
```

```
0000086A  2          END    (* NAME IS PROC OR LEVEL 1 VAR *)
0000086E  2         ELSE
0000086E  2           BEGIN      (* NAME IS A SYMBOL *)
0000086E  2           SYMBOL(SUBNO,ERROR);
00000886  2           END;       (* NAME IS A SYMBOL *)
00000886  2  IF (SYMTYPE <> PROGR) AND (ERROR = 0)
000008A4  2     THEN
000008A4  2        BEGIN  (*  GET THE SYMBOL *)
000008A4  2        GET_SYM(PTR,SYMPTR,TRUE,SYMTYPE,LENGTH,ERROR);
000008CC  2        END    (*  GET THE SYMBOL *)
000008D0  2      ELSE IF ERROR <> 0 THEN PTR:=NIL;
000008DE  2
000008DE  2  IF SYMTYPE <> PROGR
000008E8  2    THEN
000008E8  2       RELEASE_SYM_SPACE(ADDRESS);
000008F2  2
000008F2  2  END;   (* FIND_SYM *)
00000000  1
00000000  1  PROCEDURE PARENT(PROGNO,SUBNO:S_INT; VAR PARENT_NO:S_INT; PATH:PATHPTR;
00000000  2                  VAR ERROR:S_INT);
00000000  2  (*************************************************************************
00000000  2  THIS PROCEDURE RETURNS THE PARENT SUBROUTINE NUMBER AND THE PARENT'S PATH
00000000  2  NAME GIVEN THE PROGNO, AND SUBNO OF A PROCEDURE.
00000000  2  ON INPUT PATH MUST POINT TO A PATH RECORD WHICH GETS FILLED IN ON OUTPUT.
00000000  2  IF THE PROGRAM IS THE PARENT THE PARENT_NO IS SET TO 0 AND PATH REMAINS
00000000  2  UNINITIALIZED. ERROR = -3 IF THE SUBNO CAN'T BE FOUND.
00000000  2  ***********************************************************************)
00000000  2
00000000  2  VAR
00000000  2    P:NODE_PTR;
00000004  2    NEXT_SUB:S_INT;
000008FA  2
000008FA  2  BEGIN
000008FA  2
000008FA  2  P:=NODE_PTR(SUB_INDEX(PROGNO,SUBNO,NEXT_SUB));
00000910  2  IF P <> NIL
00000916  2    THEN
00000916  2       BEGIN  (* SUBNO EXISTS *)
00000916  2       IF P^.PARENT_OFF <> 0
00000922  2         THEN
00000922  2            BEGIN  (* A REAL PARENT *)
00000922  2            INC_POINTER(POINTER(P),P^.PARENT_OFF+2);  (* ADD OFFSET TO PARENT_OFF *)
00000934  2            PARENT_NO:=SHIFT(P^.SUBNO_SIZE,-8);
00000942  2            PATH^.SYM:=P^.PROC_NAME;
00000956  2            PATH^.PROGNO:=PROGNO;
00000960  2            PATH^.SUBNO:=0;
00000968  2            END    (* A REAL PARENT *)
0000096C  2         ELSE
0000096C  2            PARENT_NO:=0;
00000972  2       END   (* SUBNO EXISTS *)
00000976  2    ELSE
00000976  2       ERROR:=NOT_FOUND;
0000097E  2
0000097E  2  END;   (* PARENT *)
00000000  1  .

****WARNING ?? - Symbol: LABEL_10, is duplicated in the asmb_syn file.
****WARNING ?? - Symbol: LABEL_10, is duplicated in the asmb_syn file.

End of compilation, number of errors=    0

00000000  1  "68000" PREPROCESS
00000000  1  $EXTENSIONS ON$
00000000  1  PROGRAM INFO;
00000000  1  CONST
00000000  1    RECSIZE=128;
00000000  1    PROGLEN = 29;
00000000  1
00000000  1  #INCLUDE ERROR:INCLUD
00000000  1  #INCLUDE STD_DATA:SODADB
00000000  1  #INCLUDE SYMBOL:SODADB
00000000  1
00000000  1  #DEFINE IO_ERROR(ERROR,DCB)   BEGIN                \
00000000  1                                IOERROR(ERROR,DCB);\
00000000  1                                GOTO 10;           \
00000000  1                                END
```

```
00000000  1
00000000  1  TYPE
00000000  1
00000000  1
00000000  1    SYM_TYPES = (NODE,LEVEL1_VAR,SUBR);
00000000  1
00000000  1
00000000  1    DCBREC = RECORD
00000000  2      DCB_PTR : DCBPTR;
00000000  2      DCB_OWNER : S_INT;
00000000  1    END;
00000000  1
00000000  1    RBUFREC = RECORD
00000000  2      BUFF:BUFFTYPE;
00000000  2      LOCK:BOOLEAN;
00000000  2      PROGNO,
00000000  2      SUBNO:S_INT;
****WARNING ??          ^508
00000000  1    END;
00000000  1
00000000  1
00000000  1  VAR
00000000  1
00000000  1  $EXTVAR+$
00000000  1  DCB:DCBREC;
00000000  1  RBUF:RBUFREC;
00000000  1  $EXTVAR-$
00000000  1
00000000  1  PROCEDURE VIRTUAL_RBUF(VAR DCB:DCBTYPE; VAR RBUF:BUFFTYPE;
00000000  2                        PTR_OFFSET,INDEX:S_INT; VAR NEW_INDEX,OFFSET,ERROR:S_INT);EXTERNAL;
00000000  1
00000000  1  FUNCTION SUB_INDEX(PROGNO,SUBNO:S_INT; VAR NEXTSUB:S_INT):POINTER;EXTERNAL;
00000000  1
00000000  1  FUNCTION NODE_HEADER(PROGNO:S_INT):POINTER;EXTERNAL;
00000000  1
00000000  1  PROCEDURE GET_SYM_SPACE(SIZE,PROGNO,SUBNO:S_INT; SYMTYPE:SYM_TYPES;
00000000  2                        VAR ADDR:POINTER);EXTERNAL;
00000000  1
00000000  1  PROCEDURE GET_SYM(PTR,SYMPTR:POINTER; VAR TYPES:SYMSET; VAR LENGTH,ERROR:S_INT);EXTERNAL;
00000000  1
00000000  1  PROCEDURE PROG_PNAME(PROGNO:S_INT; VAR P:NAMEPTR; VAR ERROR:S_INT);EXTERNAL;
00000000  1
00000000  1  PROCEDURE P_POSITION (VAR DCB:DCBTYPE; RECNUM:S_INT; VAR ERROR:S_INT); EXTERNAL;
00000000  1  PROCEDURE P_READ( VAR DCB:DCBTYPE; VAR RBUFF:BUFFTYPE; SIZE:S_INT;
00000000  2                 VAR ERROR:S_INT);  EXTERNAL;
00000000  1  PROCEDURE P_CLOSE( VAR DCB:DCBTYPE; VAR ERROR: S_INT); EXTERNAL;
00000000  1
00000000  1  PROCEDURE IOERROR(VAR ERROR:S_INT; VAR DCB:DCBTYPE);EXTERNAL;
00000000  1
00000000  1  FUNCTION COMPAREIDENT(NAME1,NAME2:NAMEPTR):BOOLEAN;EXTERNAL;
00000000  1
00000000  1  PROCEDURE OUTIT(LETTER:CHAR; VUE:S_INT; BASE:CHAR);EXTERNAL;
00000000  1
00000000  1
00000000  1  PROCEDURE INC_POINTER(VAR PTR:POINTER; VALUE:S_INT);
00000004  2  (*********************************************************************
00000004  2  THIS PROCEDURE ADDS VALUE*2 TO PTR AND PUTS THE RESULT IN PTR;
00000004  2  IE. VALUE IS THE NUMBER OF WORDS TO ADVANCE THE POINTER AND
00000004  2  IT GETS CONVERTED TO NUMBER OF BYTES
00000004  2  *********************************************************************)
00000004  2
00000004  2  BEGIN
00000004  2
00000004  2  PTR:=POINTER(INTEGER(PTR)+VALUE*2);
0000001A  2
0000001A  2  END;
00000000  1
00000000  1  $GLOBPROC+$
00000000  1  PROCEDURE VIRTUAL_INC(VAR PTR:POINTER; VALUE:S_INT; VAR ERROR:S_INT);
00000000  2  (*********************************************************************
00000000  2    THIS PROCEDURE ADDS VALUE*2 TO PTR AND PUTS THE RESULT IN PTR.
00000000  2    IT CHECKS TO SEE THAT IF PTR POINTS BEYOND THE RBUF THAT ANOTHER
00000000  2    RECORD IS CALLED IN
00000000  2  *********************************************************************)
```

```
00000000  2
00000000  2  VAR
00000000  2    INDEX:S_INT;
00000002  2    NEW_INDEX,OFFSET:S_INT;
00000006  2    BUFF_PTR:INTEGER;
00000022  2
00000022  2  BEGIN
00000022  2
00000022  2  BUFF_PTR:=INTEGER(ADDR(RBUF.BUFF));
0000002A  2  OFFSET:=S_INT(INTEGER(PTR)-BUFF_PTR);
00000038  2  INDEX:=SHIFT(OFFSET,-1)+ OFFSET MOD 2 ;
00000052  2  VIRTUAL_RBUF(DCB.DCB_PTR^,RBUF.BUFF,VALUE,INDEX,NEW_INDEX,OFFSET,ERROR);
0000007A  2  PTR:=POINTER(BUFF_PTR+NEW_INDEX*2);
0000008E  2
0000008E  2  END;
00000000  1
00000000  1
00000000  1
00000000  1  PROCEDURE SUB_NAME(PNUM,SUBNO:S_INT; FNAME:NAMEPTR; VAR ERROR:S_INT);
00000000  2  (*****************************************************************************
00000000  2    THIS PROCEDURE COPYIES THE SUBROUTINE NAME TO AN ARRAY [0..7] GIVEN A PROG NUM AND
00000000  2    A SUBROUTINE NUMBER. THE NAME IS IN STANDARD PISCES FORMAT.
00000000  2    IT RETURNS AN ERROR = -3 IF THE SUBNO DOES NOT EXIST
00000000  2  *****************************************************************************)
00000000  2
00000000  2  VAR
00000000  2    I:S_INT;
00000002  2    P:NODE_PTR;
00000006  2    LEN:S_INT;
00000008  2    NEXT_SUB:S_INT;
0000000A  2    PNAME:NAMEPTR;
00000096  2
00000096  2  BEGIN
00000096  2
00000096  2  IF SUBNO = 0
0000009E  2     THEN
0000009E  2        BEGIN   (* MAIN PROGRAM *)
0000009E  2        PROG_PNAME(PNUM,PNAME,ERROR);
000000B6  2        IF ERROR = 0
000000C0  2           THEN FNAME^:=PNAME^
000000D4  2           ELSE ERROR:=NOT_FOUND;
000000DC  2        END     (* MAIN PROGRAM *)
000000E0  2     ELSE
000000E0  2        BEGIN   (* A PROCEDURE *)
000000E0  2        P:=NODE_PTR(SUB_INDEX(PNUM,SUBNO,NEXT_SUB));
000000F6  2        IF P = NIL
000000FC  2           THEN ERROR:=NOT_FOUND
00000108  2           ELSE
00000108  2              BEGIN  (* SUBNO EXISTS *)
00000108  2              ERROR:=0;
0000010E  2              FNAME^:=P^.PROC_NAME;
00000122  2              END;  (* SUBNO EXISTS *)
00000122  2        END;  (* A PROCEDURE *)
00000122  2
00000122  2  END; (* SUB_NAME *)
00000000  1
00000000  1  PROCEDURE GET_PROC_DATA(PNUM,SUBNO:S_INT; P:NODE_PTR; VAR ADDRESS:POINTER; VAR ERROR:S_INT);
00000000  2  (*****************************************************************************
00000000  2  THIS PROCEDURE GETS THE PROCEDURE DATA GIVEN THE ADDRESS OF THE NODE INDEX
00000000  2  OF A PROCEDURE (P)
00000000  2  *****************************************************************************)
00000000  2
00000000  2  LABEL
00000000  2    10;
00000000  2
00000000  2  VAR
00000000  2    LEN:S_INT;
00000002  2    DISC_LOC,SIZE:S_INT;
00000006  2    BUFF:BUFFPTR;
0000012A  2
0000012A  2  BEGIN
0000012A  2
0000012A  2  IF P <> NIL THEN
00000132  2    BEGIN     (* FOUND THE SUBNO *)
```

```
00000132  2     DISC_LOC:=P^.RECNO;
0000013C  2     ERROR:=0;
00000142  2     END       (* FOUND THE SUBNO *)
00000146  2       ELSE ERROR:=NOT_FOUND;
0000014E  2  IF (ERROR=0) THEN
00000158  2    BEGIN     (* PROCEDURE RECORD IS NOT IN MEMORY *)
00000158  2    GET_SYM_SPACE(RECSIZE,PNUM,SUBNO,SUBR,ADDRESS);
00000178  2    BUFF:=BUFFPTR(ADDRESS);
00000180  2    P_POSITION(DCB.DCB_PTR^,DISC_LOC,ERROR);
0000019A  2    IF ERROR <> 0 THEN IO_ERROR(ERROR,DCB.DCB_PTR^);
000001BA  2    P_READ(DCB.DCB_PTR^,BUFF^,RECSIZE,ERROR);
000001DA  2    IF ERROR <> 0 THEN IO_ERROR(ERROR,DCB.DCB_PTR^);
000001FA  2    ADDRESS:=POINTER(INTEGER(ADDRESS)+2);
00000203  2    END;      (* PROCEDURE RECORD IS NOT IN MEMORY *)
00000203  2
00000208  2  10:
00000208  2
00000208  2  END;     (* GET_PROC_DATA *)
00000000  1
00000000  1
00000000  1
00000000  1
00000000  1  PROCEDURE PROC_INFO(PNUM,SUBNO:S_INT; VAR ADDRESS:POINTER; VAR ERROR:S_INT);
00000000  2  (****************************************************************************
00000000  2    THIS PROCEDURE RETURNS THE FOLLOWING ADDRESS OF A SUBROUTINE GIVEN
00000000  2    THEN PROGRAM NUMBER AND SUBROUTINE NUMBER.
00000000  2       ERROR=0   NO ERROR
00000000  2       ERROR=-3  SUBNO NOT FOUND
00000000  2     OR ERROR RETURN FROM LOAD_SYM_REC
00000000  2  ***************************************************************************)
00000000  2
00000000  2  VAR
00000000  2    P:NODE_PTR;
00000004  2    NEXTSUB:S_INT;
00000210  2
00000210  2  BEGIN
00000210  2
00000210  2  P:=NODE_PTR(SUB_INDEX(PNUM,SUBNO,NEXTSUB));
00000226  2  IF P <> NIL
0000022C  2     THEN GET_PROC_DATA(PNUM,SUBNO,P,ADDRESS,ERROR)
00000250  2     ELSE ERROR:= NOT_FOUND;
00000258  2
00000258  2  END;  (* PROC_INFO *)
00000000  1
00000000  1
00000000  1
00000000  1
00000000  1  PROCEDURE LEVEL1VAR(PROGNO:S_INT; VAR ADDRESS:POINTER; VAR ERROR:S_INT);
00000000  2  (****************************************************************************
00000000  2    THIS PROCEDURE RETURNS THE ADDRESS, SIZE, AND DISC LOCATION OF THE
00000000  2    LEVEL 1 VARIABLE RECORD
00000000  2    ERROR=0   NO ERROR
00000000  2    ERROR=-1   INVALID PROGNO
00000000  2  ****************************************************************************)
00000000  2  LABEL
00000000  2    10;
00000000  2
00000000  2  VAR
00000000  2    P:POINTER;
00000004  2    SIZE,DISC_LOC:S_INT;
00000008  2    BUFF:BUFFPTR;
00000260  2
00000260  2  BEGIN
00000260  2
00000260  2  P:=NODE_HEADER(PROGNO);
0000026E  2  IF P <> NIL THEN
00000276  2    BEGIN     (* VALID PROGNO *)
00000276  2    INC_POINTER(P,1);
00000284  2    DISC_LOC:=P^;
0000028C  2    INC_POINTER(P,1);
0000029A  2    SIZE:=P^;
000002A2  2    ERROR:=0;
000002A8  2    END        (* VALID PROGNO *)
```

```
236 000002AC  2        ELSE ERROR:=PROG_NOT_FOUND;
237 000002B4  2  IF (SIZE = 0) AND (ERROR = 0)
238 000002D0  2     THEN ERROR:=NOT_FOUND;
239 000002D8  2  IF (ERROR=0) THEN
240 000002E2  2    BEGIN      (* VAR RECORD IS NOT IN MEMORY *)
241 000002E2  2    GET_SYM_SPACE(RECSIZE,PROGNO,0,LEVEL1_VAR,ADDRESS);
242 00000300  2    BUFF:=BUFFPTR(ADDRESS);
243 00000308  2    P_POSITION(DCB.DCB_PTR^,DISC_LOC,ERROR);
244 00000322  2    IF ERROR <> 0 THEN IO_ERROR(ERROR,DCB.DCB_PTR^);
245 00000342  2    P_READ(DCB.DCB_PTR^,BUFF^,RECSIZE,ERROR);
246 00000362  2    IF ERROR <> 0 THEN IO_ERROR(ERROR,DCB.DCB_PTR^);
247 00000382  2    ADDRESS:=POINTER(INTEGER(ADDRESS)+2);
248 00000390  2    END;       (* VAR RECORD IS NOT IN MEMORY *)
249 00000390  2
250 00000390  2  10:
251 00000390  2
252 00000390  2  END;            (* LEVEL1VAR *)
253 00000000  1  .

508: Warning: field or entry alignment; record or array comparisons may not work
****WARNING ?? - Symbol: LABEL_10, is duplicated in the asmb_syn file.

End of compilation, number of errors=    0
```

```
                     1 "68000"
                     2 *
                     3 *
                     4 *  PROCEDURE COPYBYTES(FROM,TO:INTEGER;LEN:S_INT)
                     5 *
                     6 *  THIS PROCEDURE COPYS LEN BYTES FROM ADDR FROM TO ADDR TO
                     7 *  STARTING AT THE LAST BYTES OF EACH TO ALLOW THE FROM AND TO
                     8 *  INFORMATON TO OVERLAP
                     9 *
                    10 *
                    11            GLB      COPYBYTES
 000000             12 COPYBYTES
 000000 207C        13            MOVE.L   #0,A0
 000006 306F 0004   14            MOVE.W   4(A7),A0
 00000A 3608        15            MOVE.W   A0,D3           D3 HAS THE NUMBER OF BYTES (LEN)
 00000C 2248        16            MOVE.L   A0,A1
 00000E D1EF 0006   17            ADD.L    6(A7),A0        A0 HAS THE ENDING ADDR
 000012 D3EF 000A   18            ADD.L    10(A7),A1       A1 HAS THE TO ADDR
 000016 1121        19 LOOP       MOVE.B   -(A1),-(A0)     COPYING THE BYTE
 000018 0443 0001   20            SUBI.W   #1,D3
 00001C 0C43 0000   21            CMPI.W   #0,D3           ARE WE DONE ?
 000020 66F4        22            BNE      LOOP
 000022 4E75        23            RTS

 Errors=    0
```

```
                     1 "68000"
                     2 *
                     3 *
                     4 *  PROCEDURE COPY_BACK(FROM,TO:POINTER;LEN:S_INT)
                     5 *
                     6 *  THIS PROCEDURE COPYS LEN BYTES FROM ADDR FROM TO ADDR TO
                     7 *  STARTING AT THE FIRST BYTES OF EACH TO ALLOW THE FROM AND TO
                     8 *  INFORMATON TO OVERLAP BACKWARDS
                     9 *
                    10 *
                    11            GLB      COPY_BACK
 000000             12 COPY_BACK
 000000 207C        13            MOVE.L   #0,A0
 000006 306F 0004   14            MOVE.W   4(A7),A0
 00000A 3608        15            MOVE.W   A0,D3           D3 HAS THE NUMBER OF BYTES (LEN)
 00000C 206F 0006   16            MOVE.L   6(A7),A0        A0 HAS THE TO ADDR
 000010 226F 000A   17            MOVE.L   10(A7),A1       A1 HAS THE FROM ADDR
 000014 10D9        18 LOOP       MOVE.B   (A1)+,(A0)+     COPYING THE BYTE
 000016 0443 0001   19            SUBI.W   #1,D3
 00001A 0C43 0000   20            CMPI.W   #0,D3           ARE WE DONE ?
 00001E 66F4        21            BNE      LOOP
 000020 4E75        22            RTS

 Errors=    0
```

```
00000000  1  "68000" PREPROCESS
00000000  1  $EXTENSIONS ON$
00000000  1  PROGRAM SYM_MEM;
00000000  1
00000000  1  #INCLUDE ERROR:INCLUD
00000000  1
00000000  1  #DEFINE DBERROR(ERROR)   BEGIN              \
00000000  1                           DB_ERROR(ERROR);\
00000000  1                           GOTO 10;           \
00000000  1                           END
00000000  1
00000000  1  TYPE
00000000  1    S_UNS = UNSIGNED_16;
00000000  1    S_INT = SIGNED_16;
00000000  1    POINTER = ^S_INT;
00000000  1    SSET = ( NODE,LEVEL1_VAR,PROC );
00000000  1    BUFFTYPE = ARRAY [0..128] OF S_INT;
00000000  1    RBUFREC = RECORD
00000000  2       BUFF : BUFFTYPE;
00000000  2       LOCK : BOOLEAN;
00000000  2       PROGNO,
00000000  2       SUBNO: S_INT;
****WARNING ??
                 ^508
00000000  1    END;
00000000  1
00000000  1    NODEREC = RECORD
00000000  2       PROGNO:S_INT;
00000000  2       LOCK:BOOLEAN;
00000000  2       SYM_SPACE:S_INT;
****WARNING ??
                     ^508
00000000  2       SYM_START:S_UNS;
00000000  1    END;
00000000  1
00000000  1
00000000  1  VAR
00000000  1  $EXTVAR+$
00000000  1  THE_NODE:NODEREC;
00000000  1  RBUF:RBUFREC;
00000000  1  $EXTVAR-$
00000000  1
00000000  1
00000000  1
00000000  1
00000000  1
00000000  1  PROCEDURE DB_ERROR(NO:S_INT);EXTERNAL;
00000000  1
00000000  1  PROCEDURE OUTIT(LETTER:CHAR; VALUE:S_INT; BASE:CHAR);EXTERNAL;
00000000  1
00000000  1
00000000  1  $GLOBPROC+$
00000000  1
00000000  1  PROCEDURE GET_SYM_SPACE(SIZE,PROGNO,SUBNO:S_INT; SYM_TYPE:SSET;
00000000  2                          VAR ADDRESS:POINTER);
00000000  2  (************************************************************************
00000000  2    THIS PROCEDURE CONTROLS THE SYMBOL SPACE WHICH CONSISTS OF
00000000  2    THE SPACE THE NODE INDEX OCCUPIES AND THE RBUF FOR EACH SYMBOL.
00000000  2    IT LOCKS A FLAG ON REQUEST EITHER FOR THE NODE OR RBUF AND DOES NOT
00000000  2    ALLOW ANY OTHER REQUESTS UNTIL THEY ARE RELEASED
00000000  2  ************************************************************************)
00000000  2  LABEL
00000000  2    10;
00000000  2
00000000  2  VAR
00000000  2    Q:POINTER;
00000004  2    LEN:S_INT;
00000004  2
00000004  2  BEGIN
00000004  2
00000004  2  IF SYM_TYPE = NODE
0000000C  2    THEN
0000000C  2      IF (NOT THE_NODE.LOCK)
00000014  2        THEN
00000014  2          IF THE_NODE.SYM_SPACE > SIZE
00000020  2            THEN
00000020  2              BEGIN  (* REQUESTING THE NODE SPACE AND IT IS AVAILABLE *)
```

```
00000020  2                 ADDRESS:=POINTER(INTEGER(THE_NODE.SYM_START));
0000002C  2                 THE_NODE.PROGNO:=PROGNO;
00000032  2                 END    (* REQUESTING THE NODE SPACE AND IT IS AVAILABLE *)
00000036  2               ELSE DBERROR(OUT_OF_SPACE)
00000048  2           ELSE
00000048  2             DBERROR(NODE_CONTENTION)
0000005A  2     ELSE
0000005A  2       IF (NOT RBUF.LOCK)
00000062  2         THEN
00000062  2           BEGIN  (* GETING A RBUF *)
00000062  2           RBUF.LOCK:=TRUE;
00000068  2           ADDRESS:=ADDR(RBUF.BUFF);
00000072  2           IF SIZE > 128 THEN DBERROR(BAD_DB);
0000008C  2           RBUF.PROGNO:=PROGNO;
00000092  2           RBUF.SUBNO:=SUBNO;
00000098  2           END    (* GETTING RBUF *)
0000009C  2         ELSE
0000009C  2           DBERROR(RBUF_CONTENTION);
000000AA  2
000000AA  2  10:
000000AA  2
000000AA  2  END;   (* GET_SYM_SPACE *)
00000000  1
00000000  1
00000000  1
00000000  1  PROCEDURE RELEASE_SYM_SPACE(ADDRESS:POINTER);
000000B2  2  (*************************************************************************
000000B2  2    THIS PROCEDURE UNLOCKS THE SYMBOL SPACE ASSIGNED TO
000000B2  2    A SYMBOL
000000B2  2  *************************************************************************)
000000B2  2
000000B2  2
000000B2  2  BEGIN
000000B2  2
000000B2  2  IF ADDRESS = POINTER(INTEGER(THE_NODE.SYM_START))
000000C2  2    THEN THE_NODE.LOCK:=FALSE
000000CA  2    ELSE RBUF.LOCK:=FALSE;
000000CE  2
000000CE  2  END;   (* RELEASE_SYM_SPACE *)
00000000  1
00000000  1
00000000  1  PROCEDURE RELEASE_SUBNO(PROGNO,SUBNO:S_INT);
000000D6  2  (*********************************************************
000000D6  2    THIS PROCEDURE UNLOCKS AN RBUF HELD BY A PROCEDURE OF
000000D6  2    SUBNO
000000D6  2  *********************************************************)
000000D6  2
000000D6  2  BEGIN
000000D6  2
000000D6  2  RBUF.LOCK:=FALSE;
000000DA  2
000000DA  2  END;
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  PROGRAM SOURCE_LINE_FETCHER;
00000000  1
00000000  1  #INCLUDE ERROR:INCLUD
00000000  1
00000000  1  #DEFINE IO_ERROR(ERROR,DCB)   BEGIN              \
00000000  1                                IOERROR(ERROR,DCB);\
00000000  1                                GOTO 10;           \
00000000  1                                END
00000000  1
00000000  1  CONST    BUFFERSIZE = 4;                   (* 4 SECTORS IN SOURCE LINE BUFFER *)
00000000  1           RECSIZE = 128;
00000000  1           F_TYPE = 2;                       (* SOURCE FILE TYPE *)
00000000  1           LINESIZE = 119;                   (* MAXIMUM NUMBER OF WORDS IN A SOURCE LINE *)
00000000  1  TYPE
00000000  1           S_INT = SIGNED_16;
```

```
00000000 1            NAMETYPE = ARRAY[0..7] OF S_INT;
00000000 1            NAMEPTR = ^NAMETYPE;
00000000 1            AR2_INT = ARRAY [0..1] OF S_INT;
00000000 1            DCBTYPE = S_INT;
00000000 1            BUFFTYPE = ARRAY[0..RECSIZE] OF S_INT;
00000000 1            BUFFPTR = ^BUFFTYPE;
00000000 1            DCBPTR = ^DCBTYPE;
00000000 1            POINTER = ^S_INT;
00000000 1            SOURCE_LINE = ARRAY[0..LINESIZE] OF S_INT;
00000000 1            SOURCEPTR = ^SOURCE_LINE;
00000000 1
00000000 1
00000000 1
00000000 1  PROCEDURE P_POSITION(VAR DCB:DCBTYPE;RECNO:S_INT; VAR ERROR:S_INT);EXTERNAL;
00000000 1  PROCEDURE OUTIT(LETTER:CHAR;VALUE:S_INT;BASE:CHAR);EXTERNAL;
00000000 1  PROCEDURE P_OPEN(VAR FNAME:NAMETYPE;F_TYPE,DISC:S_INT;VAR DCBLOCK:DCBTYPE;SIZE:S_INT;VAR ERROR:S_INT);EXTERNAL;
00000000 1  PROCEDURE P_CLOSE(VAR DCB:DCBTYPE;VAR ERROR:S_INT);EXTERNAL;
00000000 1  PROCEDURE P_READ(VAR DCB:DCBTYPE;VAR RBUFF:BUFFTYPE;LENGTH:S_INT;VAR ERROR:S_INT);EXTERNAL;
00000000 1  PROCEDURE PROG_FNAME(PROGNO:S_INT; VAR FNAME:NAMEPTR; VAR DISC,PROCID,ERROR:S_INT);EXTERNAL;
00000000 1  PROCEDURE COPY_BACK(FROMADDR,TOADDR:BUFFPTR;LENGTH:S_INT);EXTERNAL;
00000000 1  PROCEDURE IOERROR(VAR ERROR:S_INT; VAR DCB:DCBTYPE);EXTERNAL;
00000000 1
00000000 1
00000000 1  $GLOBPROC+$
00000000 1  PROCEDURE SCLN_FETCH(PROGNO:S_INT;LINENO:S_INT; STRINGPTR:SOURCEPTR; VAR SIZE,ERROR:S_INT);
00000000 2  $GLOBPROC-$
00000000 2  (****************************************************************************************************
00000000 2  * PURPOSE :  GIVEN A PROGRAM NUMBER AND RECORD NUMBER, RETRIEVE THE SOURCE LINE FROM THE SOURCE FILE
00000000 2  *            CONTAINING THE SOURCE LINES OF PROGRAM NUMBER.
00000000 2  *            THE SOURCE LINE IS LEFT JUSTIFIED TO REMOVE BLANKS
00000000 2  * INPUTS  :
00000000 2  *    PROGNO THE PROGRAM NUMBER
00000000 2  *    LINENO THE RECORD NUMBER WITHIN THE SOURCE FILE.
00000000 2  *    STRINGPTR = POINTER TO A 120 WORD BUFFER
00000000 2  * OUPUTS  :
00000000 2  *    SIZE  THE COUNT OF THE CHARS IN THE SOURCE LINE STRING.
00000000 2  *    ERROR THE FILE MANAGER ERROR IF THERE IS ONE
00000000 2  *    THE SOURCE FILE IS PUT INTO THE 120 WORD BUFFER LEFT JUSTIFIED
00000000 2  *    AND THE REMAINING WORDS BLANKED OUT
00000000 2  *
00000000 2  *
00000000 2  *****************************************************************************************************)
00000000 2
00000000 2     LABEL    10;                             (* ERROR RETURN *)
00000000 2
00000000 2     CONST
00000000 2           BLANK = 0020H;
00000000 2
00000000 2     VAR      FNAME:NAMEPTR;
00000004 2              LEN:S_INT;                     (* SIZE OF THE SOURCE STRING IN CHARACTERS *)
00000006 2              DERROR:S_INT;                  (* DUMMY ERROR VARIABLE *)
00000008 2              PROCID:S_INT;
0000000A 2              DISC:S_INT;
0000000C 2              I:S_INT;
0000000E 2              RLEN:S_INT;
00000010 2              BUFF:BUFFPTR;
00000014 2              ADDR_R:BUFFPTR;
00000018 2          $EXTVAR+$
00000018 2          SCR_DCB:S_INT;
00000018 2          DCBLOCK:S_INT;
00000018 2          $EXTVAR-$
00000004 2
00000004 2  BEGIN
00000004 2     NEW(BUFF);
00000014 2     IF SCR_DCB <> PROGNO
00000020 2        THEN
00000020 2           BEGIN   (* NEED TO CLOSE OLD FILE AND OPEN NEW ONE *)
00000020 2           IF SCR_DCB <> -1
00000028 2              THEN
00000028 2                 P_CLOSE(DCBLOCK,ERROR);
00000038 2           PROG_FNAME(PROGNO,FNAME,DISC,PROCID,ERROR);
00000058 2           IF ERROR <> 0 THEN GOTO 10;
00000066 2           P_OPEN(FNAME^,F_TYPE,DISC,DCBLOCK,BUFFERSIZE,ERROR);
0000008C 2           IF ERROR <> 0 THEN IO_ERROR(ERROR,DCBLOCK);
000000AA 2           SCR_DCB:=PROGNO;
```

```
000000B0  2            END;    (* NEED TO CLOSE OLD FILE AND OPEN NEW ONE *)
000000B0  2        P_POSITION (DCBLOCK,LINENO,ERROR);
000000C8  2        IF ERROR > 1 THEN IO_ERROR(ERROR,DCBLOCK);
000000EA  2        P_READ(DCBLOCK,BUFF^,RECSIZE,ERROR);
00000108  2        IF ERROR > 1 THEN IO_ERROR(ERROR,DCBLOCK);
0000012A  2        IF ERROR = 1
00000138  2           THEN
00000138  2              BEGIN
00000138  2              ERROR:=NOT_FOUND;
00000140  2              GOTO 10;
00000144  2              END;
00000144  2
00000144  2        LEN:=SHIFT(SHIFT(BUFF^[0],8),-8);
00000152  2        RLEN:=LEN;
00000156  2        I:=1;
0000015C  2        WHILE (BUFF^[I]=2020H) AND (I < RLEN) DO
00000188  2           BEGIN  (* REMOVE LEADING BLANKS *)
00000188  2           I:=I+1;
0000018C  2           LEN:=LEN-1;
00000190  2           END;    (* REMOVE LEADING BLANKS *)
00000192  2        ADDR_R:=ADDR(BUFF^[I]);
000001A4  2        IF SHIFT(BUFF^[I],-8)=BLANK
000001B8  2           THEN
000001B8  2              BEGIN    (* GET RID OF ODD BLANK *)
000001B8  2              SIZE:=LEN*2-1;
000001C8  2              ADDR_R:=BUFFPTR(INTEGER(ADDR_R)+1);
000001D2  2              STRINGPTR^[LEN-1]:=S_INT(INTEGER(BLANK));
000001E4  2              END       (* GET RID OF ODD BLANK *)
000001E8  2           ELSE
000001E8  2              BEGIN    (* ON EVEN BOUNDARY *)
000001E8  2              SIZE:=LEN*2;
000001F6  2              END;     (* ON EVEN BOUNDARY *)
000001F6  2
000001F6  2        COPY_BACK(ADDR_R,BUFFPTR(STRINGPTR),SIZE);
0000020E  2        FOR I:=LEN TO LINESIZE DO STRINGPTR^[I]:=2020H;
00000240  2  10:
00000240  2
00000240  2    DISPOSE(BUFF);
00000250  2
00000250  2  END;
00000000  1  .
```

End of compilation, number of errors= 0

```
00000000  1  "68000"  PREPROCESS
00000000  1  $EXTENSIONS ON$
00000000  1  PROGRAM ASM_SYM;
00000000  1  CONST
00000000  1           ASM_SYM_TYPE = 12;
00000000  1           DCB_SIZE = 4;
00000000  1           RECSIZE = 128;                    (* SIZE OF DISC RECORDS USED *)
00000000  1
00000000  1  #INCLUDE ERROR:INCLUD
00000000  1
00000000  1  #DEFINE IO_ERROR(ERROR,DCB)   BEGIN              \
00000000  1                                IOERROR(ERROR,DCB);\
00000000  1                                GOTO 10;           \
00000000  1                                END
00000000  1  #DEFINE DBERROR(ERROR)   BEGIN              \
00000000  1                           DB_ERROR(ERROR);\
00000000  1                           GOTO 10;           \
00000000  1                           END
00000000  1
00000000  1  TYPE
00000000  1          S_INT = SIGNED_16;
00000000  1          US_INT = UNSIGNED_16;
00000000  1          AR8_INT = ARRAY[0..7] OF S_INT;
00000000  1          AR2_INT = ARRAY[0..1] OF S_INT;
00000000  1          DOUBLE_WORD = RECORD
00000000  2            LSW:S_INT;
00000000  2            MSW:S_INT,
00000000  1          END;
00000000  1          BUFFTYPE = ARRAY[0..127] OF S_INT;
00000000  1          PTRTYPE = ^S_INT;
```

```
00000000  1           LITTLE_PTR = ^BYTE;
00000000  1           DCBTYPE =  S_INT;
00000000  1           NAMETYPE = ARRAY[0..7] OF S_INT;
00000000  1           NAMEPTR = ^NAMETYPE;
00000000  1           DCBPTR = ^DCBTYPE;
00000000  1           BUFFPTR = ^BUFFTYPE;
00000000  1           ARRAYTYPE = ARRAY [0..15] OF S_INT;
00000000  1           ARRAYPTR = ^ARRAYTYPE;
00000000  1
00000000  1           LOAD_REC = RECORD
00000000  2                 PROG,MIN,MAX:AR2_INT;
00000000  1                 END;
00000000  1
00000000  1  VAR
00000000  1    DOUBLE_ADDR:BOOLEAN;
00000001  1    LOAD:LOAD_REC;
0000000E  1
0000000E  1  $EXTVAR+$
0000000E  1  ASM_RBUF:BUFFTYPE;
0000000E  1  ASM_INDEX:S_INT;
0000000E  1  ASM_SIZE:S_INT;
0000000E  1  ASM_RECNO:S_INT;
0000000E  1  ASM_DCB_NO:S_INT;
0000000E  1  ASM_DCB:S_INT;
0000000E  1  $EXTVAR-$
00000000  1
00000000  1
00000000  1  PROCEDURE P_OPEN(VAR FNAME:NAMETYPE;F_TYPE,DISC:S_INT;VAR DCB:DCBTYPE,SIZE:S_INT;VAR ERROR:S_INT);EXTERNAL;
00000000  1  PROCEDURE P_CLOSE(VAR DCB:DCBTYPE;VAR ERROR:S_INT);EXTERNAL;
00000000  1  PROCEDURE P_POSITION(VAR DCB:DCBTYPE; RECNO:S_INT; VAR ERROR:S_INT);EXTERNAL;
00000000  1  PROCEDURE P_READ(VAR DCB:DCBTYPE;VAR RBUF:BUFFTYPE;LENGTH:S_INT;VAR ERROR:S_INT);EXTERNAL;
00000000  1  PROCEDURE IOERROR(VAR ERROR:S_INT;VAR DCB:DCBTYPE);EXTERNAL;
00000000  1  PROCEDURE OUTIT(LITTER:CHAR;VALUE:S_INT;BASE:CHAR);EXTERNAL;
00000000  1
00000000  1  PROCEDURE DB_ERROR(NO:S_INT);EXTERNAL;
00000000  1
00000000  1  PROCEDURE PROG_FNAME(PROGNO:S_INT; VAR FNAME:NAMEPTR; VAR DISC,PROCID,ERROR:S_INT);EXTERNAL;
00000000  1
00000000  1  PROCEDURE PROG_LOAD(PROGNO:S_INT; VAR LOAD:LOAD_REC; VAR ERROR:S_INT);EXTERNAL;
0000000E  1
0000000E  1
0000000E  1
0000000E  1  $GLOBPROC+$
00000000  1
00000000  1  PROCEDURE POSITION_ASM(PROGNO,RECNUM:S_INT; VAR ERROR:S_INT);
00000000  2  (*************************************************************************
00000000  2  THIS PROCEDURE BACKS UP THE ASM FILE TO THE FIRST RECORD
00000000  2  *************************************************************************)
00000000  2  LABEL
00000000  2    10;
00000004  2
00000004  2  BEGIN
00000004  2
00000004  2  IF ASM_DCB_NO = PROGNO
00000010  2    THEN
00000010  2       BEGIN  (* PROG NO IS CURRENT ONE *)
00000010  2       P_POSITION(ASM_DCB,RECNUM,ERROR);
00000023  2       IF ERROR <> 0 THEN IO_ERROR(ERROR,ASM_DCB)
0000004A  2          ELSE
0000004A  2             BEGIN  (* READ IN PREVIOUS RECORD *)
0000004A  2             P_READ(ASM_DCB,ASM_RBUF,RECSIZE,ERROR);
00000066  2             IF ERROR <> 0 THEN IO_ERROR(ERROR,ASM_DCB)
00000088  2                ELSE
00000088  2                   BEGIN
00000088  2                   ASM_RECNO:=RECNUM;
0000008E  2                   ASM_INDEX:=2;   (* SKIP THE TYPE WORD *)
00000094  2                   ASM_SIZE:=SHIFT(SHIFT(ASM_RBUF[0],8),-8)-1; (* DON'T COUNT THE CHECK SUM  *)
000000A2  2                   END
000000A2  2             END;   (* READ IN PREVIOUS RECORD *)
000000A2  2       END   (* PROG NO IS CURRENT ONE *)
000000A6  2   ELSE ERROR:=PROG_NOT_FOUND;
000000AE  2
000000AE  2  10:
000000AE  2
```

```
00000OAE  2  END;   (* POSITION_ASM *)
00000000  1
00000000  1
00000000  1  PROCEDURE NEXT_LINE(VAR NUMBER:AR2_INT;
00000000  2                     VAR LINENO:S_INT; VAR ERROR:S_INT);
00000000  2  (*******************************************************************
00000000  2  THIS PROCEDURE FETCHES THE NEXT LINE IN THE ASM_SYM FILE. IT
00000000  2  PUTS THE LINE NUMBER IN LINENO AND THE ADDRESS IN NUMBER.
00000000  2  *******************************************************************)
00000000  2
00000000  2
00000000  2  VAR
00000000  2    LENGTH,J:S_INT;
00000004  2    LINE:BOOLEAN;
00000000  2
00000000  2
00000000  2
00000000  2  PROCEDURE GET_LINE(ADDRESS:INTEGER; LEN:S_INT; VAR NUM,ERROR:S_INT);
00000000  3  (*******************************************************************
00000000  3     GETS THE ASCII CHARS  AT ADDRESS AND OF SIZE LEN AND TURNS
00000000  3     IT INTO A BINARY LINE NUMBES AFTER EXTRACTING LABEL FORMAT
00000000  3     INFORMATION (IE. # FOR NEW COMPILERS AND LINE_ FOR OLD ONES
00000000  3  *******************************************************************)
00000000  3  LABEL
00000000  3    10;
00000000  3
00000000  3  VAR
00000000  3    I,CH:S_INT;
00000004  3    NUMS : ARRAY [1..4] OF S_INT;
0000000C  3    MATCH_CH,OFFSET:S_INT;
00000010  3    P:LITTLE_PTR;
000000B6  3
000000B6  3  BEGIN
000000B6  3
000000B6  3  FOR I:=1 TO 4 DO NUMS[I]:=0;
000000DC  3  I:=1;
000000E2  3  CH:=0;
000000E6  3  MATCH_CH:=20H;
000000EC  3  OFFSET:=1;
000000F2  3  WHILE I <= LEN*2-OFFSET-1 DO
0000010A  3    BEGIN   (* GET NUMBERS *)
0000010A  3    P:=LITTLE_PTR(ADDRESS+OFFSET+I);
0000011C  3    CH:=S_INT(US_INT(P^));
00000128  3    IF CH <> MATCH_CH
00000130  3       THEN
00000130  3          BEGIN  (* CONVERTING *)
00000130  3          CH:=CH-30H;
00000136  3          IF (CH < 0) OR (CH > 9)
00000154  3             THEN
00000154  3                BEGIN
00000154  3                ERROR:=BAD_ASM_SYM;
0000015C  3                DBERROR(ERROR);
0000016C  3                END;
0000016C  3          NUMS[I]:=CH;
0000017E  3          END;   (* CONVERTING *)
0000017E  3    I:=I+1;
00000182  3    END;   (* GET NUMBERS *)
00000186  3  I:=I-1;
0000018A  3  NUM:=NUMS[1]*1000+NUMS[2]*100+NUMS[3]*10+NUMS[4];
000001B0  3
000001B0  3  10:
000001B0  3
000001B0  3  END;          (* GET_LINE *)
000001B8  2
000001B8  2  BEGIN
000001B8  2  LINE:=FALSE;
000001BC  2  ERROR:=0;
000001C2  2  WHILE (ASM_INDEX <= ASM_SIZE) AND (NOT LINE) AND (ERROR = 0) DO
000001EC  2      BEGIN       (* LOOKING THROUGH A SYM REC *)
000001EC  2      LENGTH:=SHIFT(ASM_RBUF[ASM_INDEX],-13)+1;
00000202  2      IF SHIFT(SHIFT(ASM_RBUF[ASM_INDEX],8),-8) = 23H (*'#'*)
00000218  2         THEN
00000218  2            LINE:=TRUE;
```

```
0000021E  2        IF LINE
00000226  2           THEN
00000226  2              BEGIN  (* FOUND A LINE *)
00000226  2              J:=ASM_INDEX+LENGTH;
00000232  2              IF DOUBLE_ADDR
0000023A  2                 THEN
0000023A  2                    BEGIN
0000023A  2                    NUMBER[0]:=ASM_RBUF[J+1];
0000024A  2                    NUMBER[1]:=ASM_RBUF[J];
0000025E  2                    END
00000262  2                 ELSE
00000262  2                    BEGIN
00000262  2                    NUMBER[0]:=0;
00000268  2                    NUMBER[1]:=ASM_RBUF[J];
0000027C  2                    END;
0000027C  2              NUMBER:=AR2_INT(INTEGER(NUMBER) + INTEGER(LOAD.PROG));
00000292  2              GET_LINE(INTEGER(ADDR(ASM_RBUF[ASM_INDEX])),LENGTH,LINENO,ERROR);
000002C0  2              END;    (* FOUND A LINE *)
000002C0  2        IF DOUBLE_ADDR
000002C8  2           THEN ASM_INDEX:=ASM_INDEX+LENGTH+2
000002DA  2           ELSE ASM_INDEX:=ASM_INDEX+LENGTH+1;
000002E8  2        END;   (* LOOKING THROUGH A ASM REC *)
000002EC  2
000002EC  2  IF NOT LINE THEN ERROR:= NOT_FOUND;
000002FC  2
000002FC  2  END;      (* NEXT_LINE *)
00000000  1
00000000  1
00000000  1  PROCEDURE GET_NEXT_LINE(VAR ADDRESS:AR2_INT;
00000000  2                          VAR LINENO,ERROR:S_INT);
00000000  2  (*********************************************************************
00000000  2  THIS PROCEDURE CALLS NEXT_LINE UNTIL END OF FILE IS ENCOUNTERED
00000000  2  *********************************************************************)
00000000  2  LABEL
00000000  2    10;
00000000  2
00000000  2  VAR
00000000  2    EOF:BOOLEAN;
00000304  2
00000304  2  BEGIN
00000304  2
00000304  2  ERROR:=1;
0000030C  2  EOF:=FALSE;
00000310  2  WHILE (ERROR <> 0) AND (NOT EOF) DO
0000032A  2    BEGIN   (* LOOK AT RECORDS *)
0000032A  2    NEXT_LINE(ADDRESS,LINENO,ERROR);
00000346  2    IF ERROR <> 0
00000350  2       THEN
00000350  2          BEGIN  (* GET NEXT RECORD *)
00000350  2          P_READ(ASM_DCB,ASM_RBUF,RECSIZE,ERROR);
0000036C  2          IF ERROR > 1 THEN IO_ERROR(ERROR,ASM_DCB);
0000038E  2          IF ERROR <> 1
0000039C  2             THEN
0000039C  2                BEGIN  (* A VALID READ *)
0000039C  2                ASM_RECNO:=ASM_RECNO+1;
000003A0  2                ASM_INDEX:=2;   (* SKIP THE TYPE WORD *)
000003A6  2                ASM_SIZE:=SHIFT(SHIFT(ASM_RBUF[0],8),-8)-1; (* DON'T COUNT THE CHECK SUM *)
000003B4  2                END    (* A VALID READ *)
000003B8  2             ELSE
000003B8  2                EOF:=TRUE;
000003BE  2          ERROR:=1;
000003C6  2          END;   (* GET NEXT RECORD *)
000003C6  2    END;   (* LOOK AT RECORDS *)
000003CA  2
000003CA  2  10:
000003CA  2
000003CA  2  END;   (* GET_NEXT_LINE *)
00000000  1
00000000  1  PROCEDURE GET_LAST_LINE(PROGNO:S_INT; VAR ADDRESS:AR2_INT;
00000000  2                          VAR LINENO,ERROR:S_INT);
00000000  2  (*********************************************************************
00000000  2  THIS PROCEDURE GETS THE LAST LINE THAT OCCURS IN THE ASM SYM FILE
00000000  2  RELATIVE TO THE CURRENT LOCATION WITHIN THE FILE.
00000000  2  *********************************************************************)
```

```
00000000  2
00000000  2  VAR
00000000  2    EOF:BOOLEAN;
00000001  2    OLD_INDEX:S_INT;
00000004  2    SAVE_LINE:S_INT;
00000006  2    SAVE_ADDRESS:AR2_INT;
0000000A  2    SAVE_INDEX:S_INT;
0000000C  2    SAVE_RECNO:S_INT;
0000000E  2    SAVE_SIZE:S_INT;
000003D2  2
000003D2  2  BEGIN
000003D2  2
000003D2  2  ERROR:=1;
000003DA  2  SAVE_RECNO:=ASM_RECNO;
000003E0  2  SAVE_INDEX:=ASM_INDEX;
000003E6  2  SAVE_SIZE:=ASM_SIZE;
000003EC  2  IF ASM_INDEX <= ASM_SIZE
000003F8  2    THEN ASM_SIZE:=ASM_INDEX;   (* ONLY LOOK THOUGH UPPER HALF OF RECORD *)
000003FC  2  OLD_INDEX:=ASM_INDEX;
00000402  2  ASM_INDEX:=2;          (* START LOOKING AT FIRST OF RECORD *)
00000408  2  EOF:=FALSE;
0000040C  2  SAVE_LINE:=0;
00000410  2  WHILE (ERROR <> 0) AND (NOT EOF) DO
0000042A  2    BEGIN   (* LOOK AT RECORDS *)
0000042A  2    NEXT_LINE(ADDRESS,LINENO,ERROR);
00000446  2    IF ERROR <> 0
00000450  2       THEN
00000450  2          BEGIN  (* NO LINE FOUND YET *)
00000450  2          IF (SAVE_LINE = 0)   (* IF WE DIDN'T FIND A LINE AND NEVER HAVE *)
00000458  2             THEN
00000458  2                BEGIN  (* GET NEXT RECORD *)
00000458  2                IF ASM_RECNO > 1
00000464  2                   THEN
00000464  2                      BEGIN (* BACKUP A RECORD *)
00000464  2                      POSITION_ASM(PROGNO,ASM_RECNO-1,ERROR);
00000478  2                      OLD_INDEX:=RECSIZE+1;
0000047E  2                      SAVE_SIZE:=ASM_SIZE;
00000484  2                      END   (* BACKUP A RECORD *)
00000488  2                   ELSE
00000488  2                      EOF:=TRUE;
0000048E  2                ERROR:=1;
00000496  2                END   (* GET NEXT RECORD *)
0000049A  2             ELSE
0000049A  2                ERROR:=0;
000004A0  2          END    (* NO LINE FOUND YET *)
000004A4  2       ELSE
000004A4  2          IF (ASM_INDEX < OLD_INDEX)
000004B0  2             THEN
000004B0  2                BEGIN  (* SAVE DATA *)
000004B0  2                SAVE_ADDRESS:=ADDRESS;
000004B8  2                SAVE_LINE:=LINENO;
000004C0  2                SAVE_INDEX:=ASM_INDEX;
000004C4  2                SAVE_RECNO:=ASM_RECNO;
000004CA  2                ERROR:=1;
000004D2  2                END;
000004D2  2    END;   (* LOOK AT RECORDS *)
000004D6  2
000004D6  2  IF SAVE_RECNO <> ASM_RECNO
000004E2  2    THEN
000004E2  2       POSITION_ASM(PROGNO,ASM_RECNO,ERROR)
000004FA  2    ELSE
000004FA  2       ASM_SIZE:=SAVE_SIZE;
00000500  2  ASM_INDEX:=SAVE_INDEX;
00000506  2
00000506  2  ADDRESS:=SAVE_ADDRESS;
0000050E  2  IF SAVE_LINE = 0
00000516  2    THEN ERROR:=1
00000522  2    ELSE LINENO:=SAVE_LINE;
0000052A  2
0000052A  2  END;   (* GET_LAST_LINE *)
00000000  1
00000000  1  PROCEDURE ASM_INIT(PROGNO:S_INT; VAR ERROR:S_INT);
00000000  2  (*********************************************************************
```

```
00000000  2  THIS PROCEDURE INITIALIZES THE VARIABLES TO BE USED IN LN_HANDLER
00000000  2  AND LN_FETCHER
00000000  2  ********************************************************************)
00000000  2
00000000  2  LABEL 10;
00000000  2
00000000  2  VAR
00000000  2    DISC,PROCID:S_INT;
00000004  2    FNAME:NAMEPTR;
00000532  2
00000532  2  BEGIN
00000532  2
00000532  2  PROG_LOAD(PROGNO,LOAD,ERROR);
0000054A  2  IF ERROR <> 0 THEN GOTO 10;
00000558  2  PROG_FNAME(PROGNO,FNAME,DISC,PROCID,ERROR);
00000578  2  IF ERROR <> 0 THEN GOTO 10;
00000586  2  CASE PROCID OF
00000590  2     5,6,7,8,9: BEGIN
00000590  2                DOUBLE_ADDR:=FALSE;
00000594  2                END;
00000598  2     OTHERWISE
00000598  2                DOUBLE_ADDR:=TRUE;
0000059E  2  END;  (* CASE *)
000005C8  2  IF ASM_DCB_NO <> PROGNO
000005D4  2       THEN
000005D4  2         BEGIN   (* NEED TO CLOSE OLD FILE AND OPEN NEW ONE *)
000005D4  2         IF ASM_DCB_NO <> -1
000005DC  2            THEN
000005DC  2               P_CLOSE(ASM_DCB,ERROR);
000005EC  2         P_OPEN(FNAME^,ASM_SYM_TYPE,DISC,ASM_DCB,DCB_SIZE,ERROR);
00000612  2         IF ERROR <> 0 THEN IO_ERROR(ERROR,ASM_DCB);
00000630  2         P_READ(ASM_DCB,ASM_RBUF,RECSIZE,ERROR);
0000064C  2         IF ERROR <> 0 THEN IO_ERROR(ERROR,ASM_DCB);
0000066A  2         ASM_RECNO:=1;
00000670  2         ASM_INDEX:=2;   (* SKIP THE TYPE WORD *)
00000676  2         ASM_SIZE:=SHIFT(SHIFT(ASM_RBUF[0],8),-8)-1; (* DON'T COUNT THE CHECK SUM  *)
00000684  2         ASM_DCB_NO:=PROGNO;
0000068A  2         END;    (* NEED TO CLOSE OLD FILE AND OPEN NEW ONE *)
0000068A  2
0000068A  2  10:
0000068A  2
0000068A  2  END;     (*  ASM_INIT *)
00000000  1
00000000  1
00000000  1  .

****WARNING ?? - Symbol: LABEL_10, is duplicated in the asmb_syn file.
****WARNING ?? - Symbol: LABEL_10, is duplicated in the asmb_syn file.
****WARNING ?? - Symbol: LABEL_10, is duplicated in the asmb_syn file.

End of compilation, number of errors=    0

00000000  1  "68000"  PREPROCESS
00000000  1  $EXTENSIONS ON$
00000000  1  PROGRAM FIND_LINE;
00000000  1
00000000  1  TYPE
00000000  1    S_INT = SIGNED_16;
00000000  1    AR2_INT = ARRAY[0..1] OF S_INT;
00000000  1
00000000  1  #INCLUDE ERROR:INCLUD
00000000  1
00000000  1  PROCEDURE ASM_INIT(PROGNO:S_INT; VAR ERROR:S_INT);EXTERNAL;
00000000  1
00000000  1  PROCEDURE GET_NEXT_LINE(VAR ADDRESS:AR2_INT; VAR LINENO,ERROR:S_INT);EXTERNAL;
00000000  1
00000000  1  PROCEDURE POSITION_ASM(PROGNO,RECNO:S_INT; VAR ERROR:S_INT);EXTERNAL;
00000000  1
00000000  1  PROCEDURE OUTIT(LETTER:CHAR; VALUE:S_INT; BASE:CHAR);EXTERNAL;
00000000  1
00000000  1  $GLOBPROC+$
00000000  1
00000000  1  PROCEDURE FIND_LINE_NO(LINENO,PROGNO:S_INT; VAR ADDRESS:AR2_INT; VAR ERROR:S_INT);
00000000  2  (*******************************************************************************
00000000  2  *THIS PROCEDURE RETURNS THE ADDRESS OF A GIVEN LINE NUMBER OF A PASCAL
```

```
00000000  2  *PROGRAM. IT RETURNS THE FOLLOWING ERRORS:
00000000  2  *
00000000  2  *     NORMAL FILE MANAGER ERRORS  (MESSAGE DISPLAYED EXCEPT ON EOF)
00000000  2  *******************************************************************************)
00000000  2
00000000  2  VAR
00000000  2    RESTART,FOUND:BOOLEAN;
00000002  2    NEXT_LINE:S_INT;
00000004  2
00000004  2  BEGIN
00000004  2
00000004  2  ASM_INIT(PROGNO,ERROR);
00000014  2  RESTART:=TRUE;
0000001A  2  FOUND:=FALSE;
0000001E  2  WHILE (NOT FOUND) AND (ERROR = 0) DO
00000038  2    BEGIN    (* LOOKING FOR THE LINE *)
00000038  2    GET_NEXT_LINE(ADDRESS,NEXT_LINE,ERROR);
00000052  2    IF (ERROR = 1) OR (NEXT_LINE > LINENO)
00000076  2       THEN
00000076  2       IF RESTART = TRUE
00000082  2          THEN
00000082  2             BEGIN  (* WE MAY BE TOO FAR IN FILE SO BACKUP *)
00000082  2             RESTART:=FALSE;
00000086  2             POSITION_ASM(PROGNO,1,ERROR);
0000009A  2             END    (* WE MAY DE TOO FAR IN THE FILE SO DACUP *)
0000009E  2          ELSE
0000009E  2             BEGIN
0000009E  2             ERROR:=NOT_FOUND;
000000A6  2             END
000000AA  2       ELSE
000000AA  2          IF NEXT_LINE = LINENO
000000B6  2          THEN
000000B6  2             FOUND:=TRUE
000000C0  2          ELSE
000000C0  2             IF LINENO > NEXT_LINE
000000CC  2             THEN
000000CC  2                RESTART:=FALSE;
000000D0  2    END;   (* LOOKING FOR THE LINE NO *)
000000D4  2
000000D4  2
000000D4  2  END;  (* FIND_LINE_NO *)
00000000  1  .
00000000  1
```

End of compilation. number of errors=    0

```
00000000  1  "68000"
00000000  1  $EXTENSIONS ON$
00000000  1  PROGRAM DOUBLE_ADD;
00000000  1
00000000  1  $GLOBPROC+$
00000000  1  PROCEDURE D_ADD(VAR RESULT,VALUE1,VALUE2:INTEGER);
00000004  2
00000004  2  BEGIN
00000004  2  RESULT:=VALUE1+VALUE2;
00000016  2  END;         (* D_ADD *)
00000000  1  .
```

End of compilation, number of errors=    0

```
                   "68000"
                 *
                 *
                 *   FUNCTION COMPAREIDENT(FIRST,SECOND:NAMEPTR):BOOLEAN;
                 *
                 *   THIS FUNCTION COMPARES TWO PISCES IDENTIFIERS AND RETURNS
                 *   AT 0 IF THEY DO NOT MATCH OR A 1 IF THE DO.  A PISCES
                 *   IDENTIFIER IS A STRING WITH THE LENGTH IN WORDS -1 IN
                 *   THE 3 MSD'S OF THE FIRST WORD
                 *
                 *
                         GLB       COMPAREIDENT
000000             COMPAREIDENT
000000 206F 0008         MOVEA.L   8(A7),A0
000004 226F 0004         MOVEA.L   4(A7),A1
```

```
000008 3010              MOVE     [A0],D0          D0 HAS FIRST WORD OF IDENT1
00000A 3211              MOVE     [A1],D1          D1 HAS FIRST WORD OF IDENT2
00000C 363C 000D         MOVE     #13,D3
000010 E668              LSR      D3,D0
000012 E669              LSR      D3,D1
000014 B240              CMP      D0,D1            CHECK LENGTHS
000016 6700 0008         BEQ      COMP_NAME
00001A 3E3C 0000   FALSE MOVE     #0,D7
00001E 4E75              RTS
000020             COMP_NAME
000020 E340              ASL      #1,D0
000022 5240              ADDQ     #1,D0            D0 HAS NUMBER OF BYTES TO COMPARE
000024 5248              ADDQ     #1,A0
000026 5249              ADDQ     #1,A1
000028 B308        LOOP  CMPM.B   [A0]+,[A1]+      CHECK EACH BYTE OF THE STRINGS
00002A 66EE              BNE      FALSE
00002C 5340              SUBQ     #1,D0
00002E 0C40 0000         CMPI     #0,D0
000032 6700 0008         BEQ      TRUE
000036 4EF9              JMP      LOOP
00003C 3E3C 0001   TRUE  MOVE     #1,D7
000040 4E75              RTS

Errors=    0
```

```
                   "68000"
                   *
                   *
                   *   FUNCTION COMPAREFILE(FIRST,SECOND:NAMEPTR):BOOLEAN;
                   *
                   *   THIS FUNCTION COMPARES TWO PISCES FILE NAMES AND RETURNS
                   *   AT 0 IF THEY DO NOT MATCH OR A 1 IF THE DO.  SEE THE FMIRS
                   *   FOR A DESCRIPTION OF A FILE NAME
                   *
                   *
                         GLB      COMPAREFILE
000000             COMPAREFILE
000000 206F 0008         MOVEA.L  8[A7],A0
000004 226F 0004         MOVEA.L  4[A7],A1
000008 3010              MOVE.W   [A0],D0          D0 HAS FIRST WORD OF IDENT1
00000A 0240 F8FF         ANDI.W   #0F8FFH,D0
00000E 3211              MOVE.W   [A1],D1          D1 HAS FIRST WORD OF IDENT2
000010 0241 F8FF         ANDI.W   #0F8FFH,D1
000014 B240              CMP.W    D0,D1            CHECK FIRST WORDS
000016 6700 0008         BEQ      COMP_NAME
00001A 3E3C 0000   FALSE MOVE.W   #0,D7
00001E 4E75              RTS
000020             COMP_NAME
000020 343C 000D         MOVE.W   #13,D2
000024 E468              LSR.W    D2,D0
000026 E340              ASL.W    #1,D0            CONVERT WORDS TO BYTES
000028 5240              ADDQ     #1,D0            D0 HAS NUMBER OF BYTES TO COMPARE
00002A 5248              ADDQ     #1,A0
00002C 5249              ADDQ     #1,A1
00002E B308        LOOP  CMPM.B   [A0]+,[A1]+      CHECK EACH BYTE OF THE STRINGS
000030 66E8              BNE      FALSE
000032 5340              SUBQ     #1,D0
000034 0C40 0000         CMPI     #0,D0
000038 6700 0008         BEQ      CHECK_ID
00003C 4EF9              JMP      LOOP
000042             CHECK_ID
000042 0C41 0000         CMPI     #0,D1
000046 6700 001E         BEQ      TRUE
00004A E749              LSL.W    #3,D1
00004C 343C 000E         MOVE.W   #14,D2
000050 E469              LSR.W    D2,D1            D1 HAS NUMBER OF WORDS IN USERID
000052 B348        LOOP2 CMPM.W   [A0]+,[A1]+
000054 66C4              BNE      FALSE
000056 5341              SUBQ     #1,D1
000058 0C41 0000         CMPI     #0,D1
00005C 6700 0008         BEQ      TRUE
000060 4EF9              JMP      LOOP2
000066 3E3C 0001   TRUE  MOVE     #1,D7
00006A 4E75              RTS

Errors=    0
```

```
 "68000"

 MESSAGE         MACRO &TITLE,&TEXT
 &TITLE          DC.W  (E_&TITLE-&TITLE-2)/2+1
                 ASCII &TEXT
 E_&TITLE        ASCII " "
                 MEND
          DATA

          GLB     DB_TBL
000000                DB_TBL
000000 0000006C          DC.L     ERROR10
000004 000000A6          DC.L     ERROR11
000008 000000C0          DC.L     ERROR12
00000C 000000D4          DC.L     ERROR13
000010 000000EA          DC.L     ERROR14
000014 000000F8          DC.L     ERROR15
000018 0000 0000         DC.L     0   ERROR16
00001C 0000 0000         DC.L     0   ERROR17
000020 0000 0000         DC.L     0   ERROR18
000024 0000 0000         DC.L     0   ERROR19
000028 00000114          DC.L     ERROR20
00002C 0000011E          DC.L     ERROR21
000030 0000013A          DC.L     ERROR22
000034 0000015C          DC.L     ERROR23
000038 00000184          DC.L     ERROR24
00003C 0000 0000         DC.L     0   ERROR25
000040 0000019A          DC.L     ERROR26
000044 000001B0          DC.L     ERROR27
000048 000001C8          DC.L     ERROR28
00004C 000001DE          DC.L     ERROR29
000050 0000020A          DC.L     ERROR30
000054 0000023C          DC.L     ERROR31
000058 0000026C          DC.L     ERROR32
00005C 00000284          DC.L     ERROR33
000060 0000029E          DC.L     ERROR34
000064 000002B4          DC.L     ERROR35
000068 000002C6          DC.L     ERROR36

00006C                   MESSAGE  ERROR10,"More than one procedure in this file has the same name"
0000A6                   MESSAGE  ERROR11,"out of database space"
0000BF                   MESSAGE  ERROR12,"symbol not found"
0000D4                   MESSAGE  ERROR13,"program not found"
0000E9                   MESSAGE  ERROR14,"no symbol"
0000F7                   MESSAGE  ERROR15,"invalid type encountered"
000114                   MESSAGE  ERROR20,"bad db"
00011E                   MESSAGE  ERROR21,"processor not supported"
000139                   MESSAGE  ERROR22,"node requested without release"
00015C                   MESSAGE  ERROR23,"rbuf requested twice without release"
000184                   MESSAGE  ERROR24,"out of queue space"
00019A                   MESSAGE  ERROR26,"program not found"
0001AF                   MESSAGE  ERROR27,"bad asm symbol file"
0001C7                   MESSAGE  ERROR28,"Address not valid"
0001DD                   MESSAGE  ERROR29,"Line numbers are in different procedures"
00020A                   MESSAGE  ERROR30,"Line numbers are not within the same procedure"
00023C                   MESSAGE  ERROR31,"Too many symbols, reduce number and re-enter"
00026C                   MESSAGE  ERROR32,"program name invalid"
000284                   MESSAGE  ERROR33,"procedure name invalid"
00029E                   MESSAGE  ERROR34,"procedure is null"
0002B3                   MESSAGE  ERROR35,"bad line range"
0002C6                   MESSAGE  ERROR36,"Warning: possible performance penalty, variables not adjacent"

                         GLB      SYM_TBL
                         GLB      IDENT

000308                IDENT    DS.W     8

000318 0000 0000      SYM_TBL  DC.L     0
00031C 0000 0000         DC.L     0
000320 0000 0000         DC.L     0
000324 0000 0000         DC.L     0
000328 0000 0000         DC.L     0
00032C 0000 0000         DC.L     0
000330 0000 0000         DC.L     0
000334 0000 0000         DC.L     0
```

```
000338 0000033C            DC.L      COMP_DB_INCOMP

00033C                   COMP_DB_INCOMP
                   *        STRING    "File = "
00033C 4007                DC.W      4007H
00033E 46696C6520          ASC       "File = "
                   *        STRING,FILE  IDENT
000346 5000                DC.W      5000H
000348 0308                DC.W      IDENT
                   *        STRING    ":comp_db outdated"
00034A 4008                DC.W      4008H
00034C 3A636F6D70          ASC       ":comp_db outdated"
                   *        END_FORMAT
00035E 0000                DC.W      0

Errors=   0
00000000  1  "68000"
00000000  1
00000000  1  $EXTENSIONS ON$
00000000  1  PROGRAM SYMBOL_ERROR;
00000000  1
00000000  1  CONST
00000000  1    CODE = 0C000H;
00000000  1
00000000  1  TYPE
00000000  1
00000000  1    S_INT = SIGNED_16;
00000000  1    NAMETYPE = ARRAY [0..7]  OF S_INT;
00000000  1    ARRAYTYPE = ARRAY [1..32] OF S_INT;
00000000  1    ARRAY_PTR = ^ARRAYTYPE;
00000000  1    TABLETYPE = ARRAY [1..5] OF S_INT;
00000000  1    TABLEPTR = ^TABLETYPE;
00000000  1    EARRAY = ARRAY [1..20] OF TABLEPTR;
00000000  1    POINTER = ^S_INT;
00000000  1    BITS = (B0,B1,B2,B3,B4,B5,B6,B7,B8,B9,B10,B11,B12,B13,B14,B15);
00000000  1    SOB = SET OF BITS;
00000000  1
00000000  1
00000000  1  PROCEDURE P_FORMATTER(VAR SETTABLE:TABLETYPE;
00000000  2                      VAR DESTIN:S_INT);EXTERNAL;
00000000  1
00000000  1  PROCEDURE P_MESSAGE(P:POINTER; CODE:S_INT);EXTERNAL;
00000000  1
00000000  1  $GLOBPROC+$
00000000  1  PROCEDURE SYM_ERROR(NO:S_INT; VAR NAME:NAMETYPE);
00000000  2  (*************************************************************************
00000000  2  THIS PROCEDURE PUTS UP ON THE STATUS LINE ERROR NO (NO) AND USES
00000000  2  FORMATTER TO PUT UP THE NAME OF THE SYMBOL.
00000000  2  *************************************************************************)
00000000  2
00000000  2  CONST
00000000  2    BLANK =  S_INT(20H);
00000000  2
00000000  2  VAR
00000000  2
00000000  2    P:TABLEPTR;
00000004  2    I:S_INT;
00000006  2    Q:POINTER;
0000000A  2    MESSBUF:ARRAYTYPE;
0000004A  2
0000004A  2  $EXTVAR+$
0000004A  2  SYM_TBL:EARRAY;
0000004A  2  IDENT:NAMETYPE;
0000004A  2  $EXTVAR-$
00000004  2
00000004  2
00000004  2
00000004  2  BEGIN
00000004  2
00000004  2  FOR I:=1 TO 32  DO
0000000A  2    MESSBUF[I]:=0;
0000002A  2  IDENT:=NAME;
0000003A  2  P:=SYM_TBL[NO-9];
00000050  2  Q:=POINTER(ADDR(MESSBUF[2]));
00000058  2  P_FORMATTER(P^,Q^);
```

```
60 0000006A  2  I:=2;
61 00000070  2  WHILE (I < 32) AND (MESSBUF[I] <> 0) DO
62 0000009A  2    BEGIN
63 0000009A  2    IF SHIFT(SHIFT(MESSBUF[I],8),-8) = 0
64 000000AC  2       THEN MESSBUF[I]:=MESSBUF[I]+BLANK;
65 000000C8  2    I:=I+1;
66 000000CC  2    END;
67 000000CE  2  MESSBUF[1]:=I-2;
68 000000D8  2  Q:=ADDR(MESSBUF);
69 000000E0  2  P_MESSAGE(Q,CODE);
70 000000EE  2
71 000000EE  2  END;     (* SYM_ERROR *)
72 00000000  1  .

End of compilation, number of errors=    0

                      1 "68000"
                      2           GLB      DCB
                      3           GLB      THE_NODE
                      4           GLB      RBUF
                      5           GLB      PROG
                      6           GLB      SCR_DCB
                      7           GLB      DCBLOCK
                      8           GLB      ASM_DCB
                      9           GLB      ASM_DCB_NO
                     10           GLB      ASM_SIZE
                     11           GLB      ASM_INDEX
                     12           GLB      ASM_RBUF
                     13           GLB      ASM_RECNO
                     14           GLB      LAST_LINE
                     15           GLB      L_FILE
                     16           GLB      L_DCB
                     17           DATA
000000 0FFF          18 L_DCB     DC.W     0FFFH
000002 0000 0000     19 L_FILE    DC.W     0,0,0,0,0,0,0,0  LINK SYM FILE NAME CURRENTLY OPENED
000012 0000          20 LAST_LINE DC.W     0                PROGNO OF LAST LINE FOUND
000014 0000          21           DC.W     0                FIRT LINE NUMBER OF EQUAL ADDRESS
000016 0000          22           DC.W     0                LAST LINE NUMBER OF EQUAL ADDRESS
000018 0000          23           DC.W     0                NO_END   BOOLEAN FLAG TO KNOW IF END ADDR IS VALID
00001A 0000 0000     24           DC.L     0                STARTING LINE ADDR
00001E 0000 0000     25           DC.L     0                ENDING LINE ADDR
000022 0FFF          26 ASM_DCB   DC.W     0FFFH            FILE DESCRIPTOR OF THE ASM_SYM FILE
000024 FFFF          27 ASM_DCB_NO DC.W    -1               PROGNO OF CURRENT OPENED ASM SYM FILE
000026 0000          28 ASM_SIZE  DC.W     0                CURRENT ASM REC SIZE
000028 0000          29 ASM_RECNO DC.W     0                CURRENT ASM REC NUMBER
00002A 0000          30 ASM_INDEX DC.W     0                CURRENT INDEX INTO THE RBUF
00002C               31 ASM_RBUF  DS.W     129              READ BUFFER FOR ASM SYM FILE
00012E FFFF          32 SCR_DCB   DC.W     -1               PROGNO OF CURRENT OPENED SOURCE FILE
000130 0FFF          33 DCBLOCK   DC.W     0FFFH            THE FILE DESCRIPTOR OF THE SOURCE FILE
000132 FFFF          34 PROG      DC.W     -1               COUNT
000134 0000 0000     35           DC.L     0                PTR TO START
000138               36 RBUF      DS.W     129
00023A 0000          37           DC.W     0                LOCK
00023C 0000          38           DC.W     0                PROGNO
00023E 0000          39           DC.W     0                SUBNO
000240 00000246      40 DCB       DC.L     DCBSPACE         POINTER TO THE DCB
000244 FFFF          41           DC.W     -1               PROGNO OF THE DCB
000246 0FFF          42 DCBSPACE  DC.W     0FFFH
000248 FFFF          43 THE_NODE  DC.W     -1               PROGNO
00024A 0000          44           DC.W     0                LOCK
00024C 0EF5          45           DEC      3829             15*255+4 SYM_SPACE
00024E 0250          46           DC.W     $+2              SYM_START
000250               47           DS.W     3829

Errors=    0

1 00000000  1  "68000"  PREPROCESS
2 00000000  1  $EXTENSIONS ON$
3 00000000  1  PROGRAM GET_THE_SYMBOL;
4 00000000  1  *
5 00000000  1  CONST
6 00000000  1    MAXTYPE = 128;
7 00000000  1    MAXQUEUESIZE = 32;
8 00000000  1    RECSIZE = 128;
9 00000000  1
```

```
00000000 1  #INCLUDE ERROR:INCLUD
00000000 1
00000000 1  #DEFINE IO_ERROR(ERROR,DCB)   BEGIN              \
00000000 1                                IOERROR(ERROR,DCB);\
00000000 1                                GOTO 10;           \
00000000 1                                END
00000000 1
00000000 1  #DEFINE DBERROR(ERROR)   BEGIN              \
00000000 1                           DB_ERROR(ERROR);\
00000000 1                           GOTO 10;           \
00000000 1                           END
00000000 1
00000000 1  TYPE
00000000 1    S_UNS = UNSIGNED_16;
00000000 1    S_INT = SIGNED_16;
00000000 1    SYMSET = (PROG,PROC,FUNC,VARIABLE,CONSTANT,PARM,EXTSUBR);
00000000 1    SYM_ARRAY = ARRAY [0..3000] OF S_INT;
00000000 1    ARRAYPTR = ^SYM_ARRAY;
00000000 1    DCBTYPE =  S_INT;
00000000 1    POINTER = ^S_INT;
00000000 1    BUFFTYPE = ARRAY [0..RECSIZE] OF S_INT;
00000000 1    BUFFPTR = ^BUFFTYPE;
00000000 1    DCB_PTR = ^DCBTYPE;
00000000 1
00000000 1    DCBREC = RECORD
00000000 2        DCBPTR:DCB_PTR;
00000000 2        OWNER:S_INT;
00000000 1    END;
00000000 1
00000000 1    RBUFREC = RECORD
00000000 2        BUFF:BUFFTYPE;
00000000 2        LOCK:BOOLEAN;
00000000 2        PROGNO,
00000000 2        SUBNO:S_INT;
****WARNING ??
                    ^508
00000000 1    END;
00000000 1
00000000 1    TYPEREC = RECORD
00000000 2        ADDRESS,LOC:S_INT;
00000000 1    END;
00000000 1
00000000 1    TYPE_ARRAY = ARRAY [1..MAXTYPE] OF TYPEREC;
00000000 1
00000000 1    QUEUE_TYPE = RECORD
00000000 2        RECNO,INDEX,DISP,VALUE:S_INT;
00000000 1    END;
00000000 1
00000000 1    QUEUE_ARRAY = ARRAY [1..MAXQUEUESIZE] OF QUEUE_TYPE;
00000000 1
00000000 1  VAR
00000000 1    TYPES:TYPE_ARRAY;
00000200 1    QUEUE:QUEUE_ARRAY;
00000000 1
00000000 1  PROCEDURE P_POSITION (VAR DCB:DCBTYPE; RECNUM:S_INT; VAR ERROR:S_INT); EXTERNAL;
00000000 1  PROCEDURE P_BACKUP (VAR DCB:DCBTYPE; RECNUM:S_INT; VAR ERROR:S_INT); EXTERNAL;
00000000 1  PROCEDURE P_ADVANCE (VAR DCB:DCBTYPE; RECNUM:S_INT; VAR ERROR:S_INT); EXTERNAL;
00000000 1  PROCEDURE P_READ( VAR DCB:DCBTYPE; VAR RBUFF:BUFFTYPE; SIZE:S_INT;
00000000 2                    VAR ERROR:S_INT);  EXTERNAL;
00000000 1  PROCEDURE P_CLOSE( VAR DCB:DCBTYPE; VAR ERROR: S_INT); EXTERNAL;
00000000 1
00000000 1  PROCEDURE DB_ERROR(NO:S_INT);EXTERNAL;
00000000 1
00000000 1  PROCEDURE IOERROR(VAR ERROR:S_INT; VAR DCB:DCBTYPE);EXTERNAL;
00000000 1
00000000 1  PROCEDURE VIRTUAL_RBUF(VAR DCB:DCBTYPE; VAR RBUF:BUFFTYPE; VALUE,INDEX:S_INT;
00000000 2                         VAR NEW_INDEX,OFFSET,ERROR:S_INT);EXTERNAL;
00000000 1
00000000 1  PROCEDURE OUTIT(LETTER:CHAR; VALUE:S_INT; BASE:CHAR);EXTERNAL;
00000000 1
00000000 1  $GLOBPROC+$
00000000 1  PROCEDURE GET_SYM(PTR:ARRAYPTR; SYMPTR:POINTER; PTR_FLAG:BOOLEAN; VAR SYMTYPE:SYMSET; VAR TOTAL,ERROR:S_INT);
00000000 2  (****************************************************************************
00000000 2    THIS PROCEDURE TAKES THE SYMBOL POINTED TO BY SYMPTR AND MOVES IT TO
00000000 2    AN ARRAY POINTED TO BY PTR.  IF ALL THE INFORMATION WILL NOT FIT
```

```
00000000 2    IN THE ARRAY THEN POINTERS TO TYPE RECORDS NOT PUT IN THE ARRAY
00000000 2    ARE ZEROED
00000000 2    SYMTYPE IS SET TO THE COORESPONDING SYMBOL TYPE
00000000 2    IF PTR_FLAG IS FALSE THEN NO INFORMATION ABOUT WHAT A POINTER POINTS TO
00000000 2    IS RETURNED ELSE IT ALL IS.
00000000 2  ***************************************************************************)
00000000 2  LABEL
00000000 2    10;
00000000 2
00000000 2  CONST
00000000 2    PROC_ = 0;
00000000 2    FUNC_ = 1;
00000000 2    VAR_ =  2;
00000000 2    PARM_ = 6;
00000000 2    EXTSUBR_ = 15;
00000000 2
00000000 2  VAR
00000000 2    TYPE_ADDRESS,INDEX,T_INDEX,
00000000 2    N,NEW_INDEX,QUEUESIZE,CURR_RECNO,
00000000 2    LOC,I,DISP,OFFSET,RECNO,
00000000 2    RECDISP,TYPE_NUM:S_INT;
0000001C 2    ADDRESS:S_UNS;
0000001E 2    RECTYPE:S_INT;
00000020 2    VALUE:S_INT;
00000022 2    SYMBUFFSIZE :INTEGER;
00000026 2    DCB_ADDR:DCB_PTR;
0000002A 2    DONE:BOOLEAN;
0000002B 2
0000002B 2
0000002B 2  $EXTVAR+$
0000002B 2  DCB:DCBREC;
0000002B 2  RBUF:RBUFREC;
0000002B 2  $EXTVAR-$
00000000 2
00000000 2
00000000 2
00000000 2
00000000 2  PROCEDURE NEW_QUEUE(NEW_RECNO,NEW_INDEX,NEW_DISP,NEW_VALUE:S_INT; VAR QUEUESIZE:S_INT);
00000000 3  (*************************************************************************
00000000 3    THIS PROCEDURE ADDS A NEW TYPE TO THE QUEUE
00000000 3  *************************************************************************)
00000000 3  LABEL
00000000 3    10;
00000004 3
00000004 3
00000004 3  BEGIN
00000004 3
00000004 3  QUEUESIZE:=QUEUESIZE+1;
0000000E 3  IF QUEUESIZE > MAXQUEUESIZE
0000001C 3    THEN DBERROR(OUT_OF_QUEUE);
0000002A 3  WITH QUEUE[QUEUESIZE] DO
00000040 3    BEGIN
00000040 3    RECNO:=NEW_RECNO;
00000044 3    INDEX:=NEW_INDEX;
0000004E 3    DISP:= NEW_DISP;
00000058 3    VALUE:=NEW_VALUE;
00000062 3    END;   (* WITH *)
00000062 3
00000062 3  10:
00000062 3
00000062 3  END;   (* NEW_QUEUE *)
00000000 2
00000000 2
00000000 2  PROCEDURE COPY_TYPE(VAR TOTAL,INDEX,CURR_RECNO,QUEUESIZE,ERROR:S_INT;
00000000 3                    VAR DONE:BOOLEAN);
00000000 3  (*************************************************************************
00000000 3    THIS PROCEDURE COPYES A RECORD OF TYPE INFORMATION OVER TO THE ARRAY
00000000 3  *************************************************************************)
00000000 3  LABEL
00000000 3   10;
00000000 3
00000000 3  CONST
00000000 3    REC_FIELD = 3;
00000000 3    SCALAR = 7;
```

```
00000000  3    SUBRANGE = 8;
00000000  3    POINTER = 9;
00000000  3    SET_ = 10;
00000000  3    ARRAY_ = 11;
00000000  3    REC = 12;
00000000  3    TAG = 13;
00000000  3    VARIANT = 14;
00000000  3    REAL_ = 16;
00000000  3    CHAR_ = 17;
00000000  3    INT_ = 18;
00000000  3    BIT_FIELD = 19;
00000000  3    FUNC_TYPE = 20;
00000000  3
00000000  3  VAR
00000000  3    RECSIZE,RECTYPE,SIZE,TYPE_NUM,K,I:S_INT;
0000000C  3    TYPE_OFFSET : ARRAY [1..3] OF S_INT;
0000006A  3
0000006A  3  BEGIN
0000006A  3
0000006A  3  DONE:=FALSE;
00000070  3  RECSIZE:=SHIFT(RBUF.BUFF[INDEX],-8);
00000086  3  RECTYPE:=SHIFT(SHIFT(RBUF.BUFF[INDEX],8),-8);
0000009A  3  CASE RECTYPE OF
000000A2  3    REC_FIELD:  BEGIN
000000A2  3                SIZE:=RECSIZE;
000000A8  3                TYPE_NUM:=2;
000000AE  3                TYPE_OFFSET[1]:=4;
000000B4  3                TYPE_OFFSET[2]:=5;
000000BA  3                END;
000000BE  3    SCALAR:     BEGIN       (* NEED TO LOOK AHEAD IN FILE SO MIGHT AS WELL COPY *)
000000BE  3                FOR I:=1 TO 2 DO
000000C4  3                IF TOTAL < SYMBUFFSIZE
000000D8  3                   THEN
000000D8  3                      BEGIN (* COPYING *)
000000D8  3                      PTR^[TOTAL]:=RBUF.BUFF[INDEX];
000000F0  3                      TOTAL:=TOTAL+1;
000000FA  3                      VIRTUAL_RBUF(DCB_ADDR^,RBUF.BUFF,1,INDEX,NEW_INDEX,OFFSET,ERROR);
0000012A  3                      IF ERROR <> 0
00000134  3                         THEN
00000134  3                            BEGIN
00000134  3                            DONE:=TRUE;
0000013C  3                            GOTO 10;
00000140  3                            END;
00000140  3                      INDEX:=NEW_INDEX;
0000014C  3                      CURR_RECNO:=CURR_RECNO+OFFSET;
0000015A  3                      END   (* COPYING *)
0000015E  3                   ELSE
0000015E  3                      SIZE:=1;  (* TOTAL = SYMBUFFSIZE *)
00000176  3                IF TOTAL < SYMBUFFSIZE
0000018A  3                   THEN
0000018A  3                      BEGIN
0000018A  3                      SIZE:=RBUF.BUFF[INDEX]-2;  (* COPYIED TWO WORDS SO TWO LESS WORD TO COPY *)
000001A0  3                      TYPE_NUM:=0;
000001A4  3                      END;
000001A4  3                END;        (* LOOKED AHEAD AND COPYIED FIRST WORD *)
000001A8  3    SUBRANGE:   BEGIN
000001A8  3                SIZE:=7;
000001AE  3                TYPE_NUM:=1;
000001B4  3                TYPE_OFFSET[1]:=3;
000001BA  3                END;
000001BE  3    POINTER,
000001BE  3    SET_:       BEGIN
000001BE  3                SIZE:=3;
000001C4  3                TYPE_NUM:=1;
000001CA  3                TYPE_OFFSET[1]:=3;
000001D0  3                END;
000001D4  3    ARRAY_:     BEGIN
000001D4  3                SIZE:=9;
000001DA  3                TYPE_NUM:=2;
000001E0  3                TYPE_OFFSET[1]:=4;
000001E6  3                TYPE_OFFSET[2]:=5;
000001EC  3                END;
000001F0  3    REC:        BEGIN
000001F0  3                SIZE:=4;
```

```
000001F6  3                 TYPE_NUM:=1;
000001FC  3                 TYPE_OFFSET[1]:=4;
00000202  3                 END;
00000206  3    TAG:         BEGIN
00000206  3                 SIZE:=8;
0000020C  3                 TYPE_NUM:=2;
00000212  3                 TYPE_OFFSET[1]:=4;
00000218  3                 TYPE_OFFSET[2]:=5;
0000021E  3                 END;
00000222  3    VARIANT:     BEGIN
00000222  3                 SIZE:=5;
00000228  3                 TYPE_NUM:=2;
0000022E  3                 TYPE_OFFSET[1]:=4;
00000234  3                 TYPE_OFFSET[2]:=5;
0000023A  3                 END;
0000023E  3    REAL_,CHAR_,
0000023E  3    INT_         :BEGIN
0000023E  3                 SIZE:=2;
00000244  3                 TYPE_NUM:=0;
00000248  3                 END;
0000024C  3    BIT_FIELD    :BEGIN
0000024C  3                 SIZE:=4;
00000252  3                 TYPE_NUM:=0;
00000256  3                 END;
0000025A  3    FUNC_TYPE    :BEGIN
0000025A  3                 SIZE:=2;
00000260  3                 TYPE_NUM:=1;
00000266  3                 TYPE_OFFSET[1]:=2;
0000026C  3                 END;
00000270  3    OTHERWISE
00000270  3                 BEGIN  (* INVALID TYPE *)
00000270  3                 ERROR:=INVALID_TYPE;
00000278  3                 SIZE:=0;
0000027C  3                 DONE:=TRUE;
00000284  3                 END;   (* INVALID TYPE *)
00000284  3  END;   (* CASE *)
000002C8  3
000002C8  3  IF TOTAL+SIZE > SYMBUFFSIZE
000002E4  3    THEN
000002E4  3      BEGIN
000002E4  3      DONE:=TRUE;
000002EC  3      ERROR:=OUT_OF_SPACE;
000002F4  3      END
000002F8  3    ELSE
000002F8  3      IF NOT DONE
00000302  3        THEN
00000302  3          BEGIN   (* STILL WITHIN ARRAY LIMITS *)
00000302  3          K:=1;
00000308  3          FOR I:=1 TO SIZE DO
0000031E  3            BEGIN     (* COPY *)
0000031E  3            PTR^[TOTAL]:=RBUF.BUFF[INDEX];
00000340  3            IF (TYPE_NUM > 0) AND (I = TYPE_OFFSET[K])
0000036A  3              THEN
0000036A  3                BEGIN  (* QUEUE UP NEW TYPES *)
0000036A  3                IF (RECTYPE = POINTER) AND (NOT PTR_FLAG)   (* THIS WAS ADDED TO REDUCE THE SIZE OF DB RECS *)
0000038A  3                  THEN PTR^[TOTAL]:=0                       (* BY NOT GIVING PTR DATA TO MEASUREMENTS THAT DON'T
0000039E  3                  ELSE                                      (* SUPPORT POINTER DEREFERANCEING *)
0000039E  3                    IF RBUF.BUFF[INDEX] <> 0
000003B2  3                      THEN
000003B2  3                        NEW_QUEUE(CURR_RECNO,INDEX,TOTAL,RBUF.BUFF[INDEX],QUEUESIZE);
000003E4  3                K:=K+1;
000003E8  3                TYPE_NUM:=TYPE_NUM-1;
000003EC  3                END;  (* QUEUE UP NEW TYPES *)
000003EC  3            TOTAL:=TOTAL+1;
000003F6  3            IF I < SIZE
00000402  3              THEN
00000402  3                BEGIN  (* ADVANCE INDEX *)
00000402  3                VIRTUAL_RBUF(DCB_ADDR^,RBUF.BUFF,1,INDEX,NEW_INDEX,OFFSET,ERROR);
00000432  3                IF ERROR <> 0
0000043C  3                  THEN
0000043C  3                    BEGIN
0000043C  3                    DONE:=TRUE;
00000444  3                    GOTO 10;
00000448  3                    END;
```

```
00000448 3                  INDEX:=NEW_INDEX;
00000454 3                  CURR_RECNO:=CURR_RECNO+OFFSET;
00000462 3                  END    (* ADVANCE INDEX *)
00000462 3              END;  (* COPY *)
00000476 3            END;   (*  STILL WITHIN ARRAY LIMITS *)
00000476 3
00000476 3 10:
00000476 3
00000476 3 END;    (* COPY_TYPE *)
00000000 2
00000000 2
00000000 2
00000000 2 FUNCTION OLD_TYPE(TYPEADDRESS:S_INT; VAR LOC:S_INT; TYPE_NUM:S_INT):BOOLEAN;
00000001 3 (*************************************************************************
00000001 3   THIS FUNCTION RETURNS TRUE IF THE TYPE ADDRESS IS IN THE TYPES ARRAY
00000001 3   ELSE IT RETURNS FALSE.  IF IT RETURNS TRUE THEN IT RETURNS THE LOC VALUE
00000001 3   IN THE TYPE ARRAY.
00000001 3 ************************************************************************)
00000001 3
00000001 3 VAR
00000001 3   FOUND:BOOLEAN;
00000002 3   I:S_INT;
0000047E 3
0000047E 3 BEGIN
0000047E 3
0000047E 3 FOUND:=FALSE;
00000482 3 I:=1;
00000488 3 WHILE (NOT FOUND) AND (I <= TYPE_NUM) DO
000004A4 3   BEGIN   (* SEARCHING *)
000004A4 3   IF TYPES[I].ADDRESS = TYPEADDRESS
000004B8 3      THEN
000004B8 3         BEGIN   (* FOUND *)
000004B8 3         LOC:=TYPES[I].LOC;
000004CC 3         FOUND:=TRUE;
000004D2 3         END     (* FOUND *)
000004D6 3      ELSE
000004D6 3         I:=I+1;
000004DA 3   END;   (* SEARCHING *)
000004DC 3
000004DC 3 OLD_TYPE:=FOUND;
000004E2 3
000004E2 3 END;   (* OLD_TYPE *)
00000000 2
00000000 2
00000000 2
00000000 2 PROCEDURE NEW_TYPE(TYPEADDRESS,TOTAL:S_INT; VAR TYPE_NUM:S_INT);
000004F0 3 (*********************************************************************
000004F0 3   THIS PROCEDURE ADDS A TYPE TO THE TYPE LIST
000004F0 3 ********************************************************************)
000004F0 3
000004F0 3 BEGIN
000004F0 3
000004F0 3 TYPE_NUM:=TYPE_NUM+1;
000004FA 3 IF TYPE_NUM <= MAXTYPE
00000508 3   THEN
00000508 3   WITH TYPES[TYPE_NUM] DO
00000518 3      BEGIN
00000518 3      ADDRESS:=TYPEADDRESS.
0000051C 3      LOC:=TOTAL;
00000526 3      END;   (* WITH *)
00000526 3
00000526 3 END;   (* NEW_TYPE *)
00000000 2
00000000 2
00000000 2
00000000 2 PROCEDURE NEXT_QUEUE(VAR QUEUESIZE,NEW_RECNO,NEW_INDEX,NEW_DISP,NEW_VALUE:S_INT;
00000000 3                      VAR DONE:BOOLEAN);
00000000 3 (***********************************************************************
00000000 3   THIS PROCEDURE GETS THE NEXT TYPE IN THE QUEUE
00000000 3 ***********************************************************************)
00000000 3
00000000 3 VAR
00000000 3   I:S_INT;
```

```
0000052E  3
0000052E  3  BEGIN
0000052E  3
0000052E  3  IF QUEUESIZE > 0
00000538  3    THEN
00000538  3       BEGIN   (* GET TOP ELEMENT *)
00000538  3       WITH QUEUE[1] DO
00000540  3          BEGIN
00000540  3          NEW_RECNO:=RECNO;
00000546  3          NEW_INDEX:=INDEX;
00000552  3          NEW_DISP:=DISP;
0000055E  3          NEW_VALUE:=VALUE;
0000056A  3          END;    (* WITH *)
0000056A  3       IF QUEUESIZE > 1 THEN
00000578  3          FOR I:=1 TO QUEUESIZE-1 DO
0000058C  3             QUEUE[I]:=QUEUE[I+1];  (* MOVE ELEMENTS UP *)
000005C0  3       QUEUESIZE:=QUEUESIZE-1;
000005CA  3       END    (* GET TOP ELEMENT *)
000005CE  3    ELSE
000005CE  3       DONE:=TRUE;
000005D6  3
000005D6  3  END;  (* NEXT_QUEUE *)
00000000  2
00000000  2
00000000  2  PROCEDURE ZERO_POINTERS(QUEUESZIZE:S_INT);
00000000  3  (***********************************************************************
00000000  3    THIS PROCEDURE MARKS POINTERS IN THE ARRAY WHEN THERE TYPE
00000000  3    RECORDS WILL NOT FIT
00000000  3  ***********************************************************************)
00000000  3
00000000  3  VAR
00000000  3    I:S_INT;
000005DE  3
000005DE  3  BEGIN
000005DE  3
000005DE  3  IF QUEUESIZE > 0
000005EA  3    THEN
000005EA  3       FOR I:=1 TO QUEUESIZE DO
00000600  3          PTR^[QUEUE[I].DISP]:=-1;
00000636  3
00000636  3  END;   (* ZERO POINTERS *)
0000063E  2
0000063E  2
0000063E  2
0000063E  2  BEGIN
0000063E  2
0000063E  2  SYMBUFFSIZE:=TOTAL;
0000064A  2  ERROR:=0;
00000650  2  DCB_ADDR:=DCB.DCBPTR;
00000656  2  ADDRESS:=S_UNS(INTEGER(SYMPTR)-INTEGER(ADDR(RBUF)));
00000664  2  RECDISP:=SHIFT(SHIFT(RBUF.BUFF[0],8),-8);
00000670  2  INDEX:=SHIFT(S_INT(ADDRESS),-1) ;
00000676  2  RECTYPE:=SHIFT(SHIFT(RBUF.BUFF[INDEX],8),-8);
00000684  2  CASE RECTYPE OF
0000068C  2    PROC_:BEGIN
0000068C  2          SYMTYPE:=PROC;
00000694  2          T_INDEX:=0;
00000698  2          N:=16;
0000069E  2          END;
000006A2  2    FUNC_:BEGIN
000006A2  2          SYMTYPE:=FUNC;
000006AA  2          T_INDEX:=5;
000006B0  2          N:=16;
000006B6  2          END;
000006BA  2    VAR_ :BEGIN
000006BA  2          SYMTYPE:=VARIABLE;
000006C2  2          T_INDEX:=6;
000006C8  2          N:=SHIFT(RBUF.BUFF[INDEX],-8);
000006DC  2          END;
000006E0  2    PARM_:BEGIN
000006E0  2          SYMTYPE:=PARM;
000006E8  2          T_INDEX:=6;
000006EE  2          N:=SHIFT(RBUF.BUFF[INDEX],-8);
00000702  2          END;
```

```
00000706  2     EXTSUBR_
00000706  2          :BEGIN
00000706  2          SYMTYPE:=EXTSUBR;
0000070E  2          T_INDEX:=2;
00000714  2          N:=SHIFT(RBUF.BUFF[INDEX],-8);
00000728  2          END;
0000072C  2     OTHERWISE
0000072C  2     END;  (* CASE *)
0000076A  2   NEW_INDEX:=INDEX;
00000770  2   CURR_RECNO:=1;
00000776  2   TOTAL:=0;
0000077C  2   I:=0;
00000780  2   WHILE (I <= N-1) AND (ERROR = 0) DO
000007A4  2     BEGIN   (* COPY SYMBOL *)
000007A4  2     IF TOTAL+1 > SYMBUFFSIZE
000007B6  2        THEN
000007B6  2           BEGIN
000007B6  2           ERROR:=OUT_OF_SPACE;
000007BE  2           T_INDEX:=0;  (* PREVENT TYPE COPYING *)
000007C2  2           END
000007C6  2        ELSE
000007C6  2           BEGIN  (* SPACE LEFT *)
000007C6  2           PTR^[TOTAL]:=RBUF.BUFF[NEW_INDEX];
000007E2  2           TOTAL:=TOTAL+1;
000007EC  2           IF I = T_INDEX-1
000007FC  2              THEN
000007FC  2                BEGIN    (* FOUND THE TYPE POINTER *)
000007FC  2                RECNO:=CURR_RECNO;
00000802  2                IF RBUF.BUFF[NEW_INDEX]=0
00000814  2                   THEN T_INDEX:=0      (* EXTSUBR HAS NO TYPE *)
0000081C  2                   ELSE VALUE:=RBUF.BUFF[NEW_INDEX];
0000082C  2                END;      (* FOUND THE TYPE POINTER *)
0000082C  2           IF (I < N-1) AND (ERROR = 0) THEN
00000850  2              BEGIN  (* SETUP FOR NEXT VALUE *)
00000850  2              VIRTUAL_RBUF(DCB_ADDR^,RBUF.BUFF,1,NEW_INDEX,NEW_INDEX,OFFSET,ERROR);
0000087A  2              IF ERROR <> 0 THEN GOTO 10;
00000888  2              CURR_RECNO:=CURR_RECNO+OFFSET;
00000890  2              END;   (* SETUP FOR NEXT VALUE *)
00000890  2           I:=I+1;
00000894  2           END;  (* SPACE LEFT *)
00000894  2     END;     (* COPY SYMBOL *)
00000898  2   DISP:=T_INDEX-1;
000008A2  2   QUEUESIZE:=0;
000008A6  2   TYPE_NUM:=0;
000008AA  2   INDEX:=T_INDEX+INDEX-1;
000008B8  2   IF INDEX > RECDISP
000008C0  2     THEN INDEX:=INDEX-RECDISP;
000008C8  2   IF (T_INDEX <> 0)
000008D0  2     THEN
000008D0  2        BEGIN     (* A TYPE POINTER *)
000008D0  2        DONE:=FALSE;
000008D4  2        END       (* A TYPE POINTER *)
000008D8  2     ELSE DONE:=TRUE;
000008DE  2
000008DE  2   WHILE (TOTAL <= SYMBUFFSIZE) AND (NOT DONE) DO
000008FE  2     BEGIN     (* ADDING TYPES TO SYMBOL *)
000008FE  2     TYPE_ADDRESS:=VALUE+(RECNO*128)+INDEX; (* THIS ONLY WORKS IF ALL BUT THE LAST RECORD *)
00000914  2     IF OLD_TYPE(TYPE_ADDRESS,LOC,TYPE_NUM)             (* IN A PROCEDURE SET ARE ALL THE SAME LENGTH *)
00000932  2        THEN
00000932  2          PTR^[DISP]:=LOC-DISP   (* FOUND AN OLD TYPE *)
0000094C  2        ELSE
0000094C  2          BEGIN   (* ITS A NEW TYPE *)
0000094C  2          RECDISP:=RECNO-CURR_RECNO;
00000958  2          IF RECDISP < 0
0000095E  2             THEN
0000095E  2               BEGIN   (* NEED TO BACKUP *)
0000095E  2               P_BACKUP(DCB_ADDR^,-RECDISP+1,ERROR);
0000097A  2               IF ERROR <> 0 THEN IO_ERROR(ERROR,DCB_ADDR^);
0000099A  2               P_READ(DCB_ADDR^,RBUF.BUFF,RECSIZE,ERROR);
000009B8  2               IF ERROR <> 0 THEN IO_ERROR(ERROR,DCB_ADDR^);
000009D8  2               END;   (* NEED TO BACKUP *)
000009D8  2          IF RECDISP > 0
000009E0  2             THEN
000009E0  2               BEGIN  (* NEED TO ADVANCE *)
```

```
000009E0  2                 IF RECDISP <> 1
000009EC  2                    THEN
000009EC  2                       BEGIN  (* ADVANCE MORE THAN ONE REC *)
000009EC  2                       P_ADVANCE(DCB_ADDR^,RECDISP-1,ERROR);
00000A05  2                       IF ERROR <> 0 THEN IO_ERROR(ERROR,DCB_ADDR^);
00000A26  2                       END;  (* ADVANCE MORE THAN ONE REC *)
00000A26  2                 P_READ(DCB_ADDR^,RBUF.BUFF,RECSIZE,ERROR);
00000A44  2                 IF ERROR <> 0 THEN IO_ERROR(ERROR,DCB_ADDR^);
00000A64  2                 END;   (* NEED TO ADVANCE *)
00000A64  2            CURR_RECNO:=RECNO;
00000A6A  2            PTR^[DISP]:=TOTAL-DISP;
00000A82  2            VIRTUAL_RBUF(DCB_ADDR^,RBUF.BUFF,VALUE,INDEX,NEW_INDEX,OFFSET,ERROR);
00000AAC  2            IF ERROR <> 0 THEN GOTO 10;
00000ABA  2            INDEX:=NEW_INDEX;
00000AC0  2            CURR_RECNO:=CURR_RECNO+OFFSET;
00000AC8  2            RECTYPE:=SHIFT(SHIFT(RBUF.BUFF[INDEX],8),-8);
00000ADE  2            NEW_TYPE(TYPE_ADDRESS,TOTAL,TYPE_NUM);
00000AFA  2            COPY_TYPE(TOTAL,INDEX,CURR_RECNO,QUEUESIZE,ERROR,DONE);
00000B24  2            END;   (* ITS A NEW TYPE *)
00000B24  2    IF NOT DONE
00000B2C  2       THEN NEXT_QUEUE(QUEUESIZE,RECNO,INDEX,DISP,VALUE,DONE);
00000B52  2    END;  (* ADDING TYPES TO SYMBOL *)
00000B56  2
00000B56  2  10:
00000B56  2
00000B56  2  ZERO_POINTERS(QUEUESIZE);
00000B64  2
00000B64  2  END;      (* GET_SYM *)
00000000  1  .

508: Warning: field or entry alignment; record or array comparisons may not work
****WARNING ?? - Symbol: LABEL_10, is duplicated in the asmb_syn file.
****WARNING ?? - Symbol: LABEL_10, is duplicated in the asmb_syn file.

End of compilation, number of errors=    0
00000000  1  "68000" PREPROCESS
00000000  1  $EXTENSIONS ON$
00000000  1  PROGRAM VIRTUAL;
00000000  1
00000000  1  #DEFINE IO_ERROR(ERROR,DCB)    BEGIN                \
00000000  1                                 IOERROR(ERROR,DCB);\
00000000  1                                 GOTO 10;             \
00000000  1                                 END
00000000  1
00000000  1  CONST
00000000  1    MAXSIZE = 128;
00000000  1
00000000  1  TYPE
00000000  1    S_INT = SIGNED_16;
00000000  1    DCBTYPE = S_INT;
00000000  1    BUFFTYPE = ARRAY [0..128] OF S_INT;
00000000  1
00000000  1  PROCEDURE P_POSITION (VAR DCB:DCBTYPE; RECNUM:S_INT; VAR ERROR:S_INT); EXTERNAL;
00000000  1  PROCEDURE P_ADVANCE (VAR DCB:DCBTYPE; RECNUM:S_INT; VAR ERROR:S_INT); EXTERNAL;
00000000  1  PROCEDURE P_BACKUP (VAR DCB:DCBTYPE; RECNUM:S_INT; VAR ERROR:S_INT); EXTERNAL;
00000000  1  PROCEDURE P_READ( VAR DCB:DCBTYPE; VAR RBUFF:BUFFTYPE; SIZE:S_INT;
00000000  2                  VAR ERROR:S_INT);  EXTERNAL;
00000000  1  PROCEDURE P_CLOSE( VAR DCB:DCBTYPE; VAR ERROR: S_INT); EXTERNAL;
00000000  1
00000000  1  PROCEDURE IOERROR(VAR ERROR:S_INT; VAR DCB:DCBTYPE); EXTERNAL;
00000000  1
00000000  1  PROCEDURE OUTIT(LETTER:CHAR; VALUE:S_INT; BASE:CHAR);EXTERNAL;
00000000  1
00000000  1
00000000  1
00000000  1  $GLOBPROC+$
00000000  1  PROCEDURE VIRTUAL_RBUF(VAR DCB:DCBTYPE; VAR RBUF:BUFFTYPE;
00000000  2                      VALUE,INDEX:S_INT; VAR NEW_INDEX,OFFSET,ERROR:S_INT);
00000000  2  (*****************************************************************
00000000  2  THIS PROCEDURE FETCHES RECORDS DISPLACED FROM RBUF[INDEX] BY VALUE AND PUTS
00000000  2  THEM IN RBUF[NEW_INDEX] IF THEY ARE IN THE SAME RBUF OR SOMEWHERE
00000000  2  OUT ON DISC.  OFFSET IS THE NUMBER OF RECORDS FROM THE CURRENT RECORD
00000000  2  THAT THE DISC HAD TO BE MOVED TO FIND RBUF[NEW_INDEX], MINUS
```

```
00000000  2  VALUES MEAN THAT ADVANCE WILL BE REQUIRED TO POSITION BACK TO THE
00000000  2  ORIGINAL RECORD AND POSITIVE VALUES MEAN THAT BACKUP WILL BE REQUIRED.
00000000  2  (IE. OFFSET > 0 => BACKUP(DCB,OFFSET+1) AND OFFSET < 0 => ADVANCE(DCB,ABS(OFFSET)-1) )
00000000  2
00000000  2  THIS PROCEDURE ASSUMES THAT RBUF: ARRAY [0..128] OF S_INT;
00000000  2  ***************************************************************************)
00000000  2  LABEL
00000000  2    10;
00000000  2
00000000  2  VAR
00000000  2    AMOUNT_FORWARD,SIZE,AMOUNT_BEHIND:S_INT;
00000004  2
00000004  2
00000004  2  BEGIN
00000004  2
00000004  2  ERROR:=0;
0000000A  2  OFFSET:=0;
00000010  2  SIZE:=SHIFT(SHIFT(RBUF[0],8),-8);
0000001E  2  AMOUNT_FORWARD:=VALUE-(SIZE-INDEX);
0000002C  2  IF AMOUNT_FORWARD > 0
00000032  2    THEN
00000032  2       BEGIN (* POINTER IS FORWARD OF RBUF *)
00000032  2       WHILE AMOUNT_FORWARD > 0 DO
0000003A  2          BEGIN
0000003A  2          P_READ(DCB,RBUF,MAXSIZE,ERROR);
0000005A  2          IF ERROR <> 0 THEN IO_ERROR(ERROR,DCB);
0000007A  2          SIZE:=SHIFT(SHIFT(RBUF[0],8),-8);
00000088  2          AMOUNT_FORWARD:=AMOUNT_FORWARD-SIZE;
0000008C  2          OFFSET:=OFFSET+1;
00000096  2          END;
00000098  2       NEW_INDEX:=SIZE+AMOUNT_FORWARD;
000000A6  2       END    (* POINTER IS FORWARD OF RBUF *)
000000AA  2    ELSE
000000AA  2       BEGIN   (* NOT FORWARD *)
000000AA  2       AMOUNT_BEHIND:=INDEX+VALUE-1;
000000B8  2       IF AMOUNT_BEHIND < 0
000000BE  2          THEN
000000BE  2             BEGIN  (* POINTER IS BEHIND RBUF *)
000000BE  2             WHILE AMOUNT_BEHIND < 0 DO
000000C6  2                BEGIN
000000C6  2                P_BACKUP(DCB,2,ERROR);
000000E0  2                IF ERROR <> 0 THEN IO_ERROR(ERROR,DCB);
00000100  2                P_READ(DCB,RBUF,MAXSIZE,ERROR);
00000120  2                IF ERROR <> 0 THEN IO_ERROR(ERROR,DCB);
00000140  2                SIZE:=SHIFT(SHIFT(RBUF[0],8),-8);
0000014E  2                AMOUNT_BEHIND:=AMOUNT_BEHIND+SIZE;
00000152  2                OFFSET:=OFFSET-1;
0000015C  2                END;
00000160  2             NEW_INDEX:=AMOUNT_BEHIND+1;
0000016C  2             END    (* POINTER IS BEHIND RBUF *)
00000170  2          ELSE
00000170  2             BEGIN   (* WITHIN CURRENT RECORD *)
00000170  2             NEW_INDEX:=INDEX+VALUE;
0000017E  2             END;    (* WITHIN CURRENT RECORD *)
0000017E  2       END;  (* NOT FORWARD *)
0000017E  2
0000017E  2  10:
0000017E  2
0000017E  2  END;   (* VIRTUAL_RBUF *)
00000000  1
00000000  1  .

End of compilation, number of errors=    0

00000000  1  "68000"  PREPROCESS
00000000  1  $EXTENSIONS ON$
00000000  1  PROGRAM LINE_NUMBER_HANDLER;
00000000  1  CONST
00000000  1          SOURCESIZE = 119;
00000000  1          RECSIZE = 128;
00000000  1
00000000  1  #INCLUDE ERROR:INCLUD
00000000  1
00000000  1  #DEFINE IO_ERROR(ERROR,DCB)   BEGIN
```

```
00000000 1                         IOERROR(ERROR,DCB);\
00000000 1                         GOTO 10;          \
00000000 1                         END
00000000 1
00000000 1  TYPE
00000000 1          S_INT = SIGNED_16;
00000000 1          US_INT = UNSIGNED_16;
00000000 1          AR8_INT = ARRAY[0..7] OF S_INT;
00000000 1          AR2_INT = ARRAY[0..1] OF S_INT;
00000000 1          BUFFTYPE = ARRAY[0..128] OF S_INT;
00000000 1          PTRTYPE = ^S_INT;
00000000 1          LITTLE_PTR = ^BYTE;
00000000 1          DCBTYPE =  S_INT;
00000000 1          NAMETYPE = ARRAY[0..7] OF S_INT;
00000000 1          NAMEPTR = ^NAMETYPE;
00000000 1          DCBPTR = ^DCBTYPE;
00000000 1          BUFFPTR = ^BUFFTYPE;
00000000 1          ARRAYTYPE = ARRAY [0..15] OF S_INT;
00000000 1          ARRAYPTR = ^ARRAYTYPE;
00000000 1          DOUBLE_WORD = RECORD
00000000 2             LSW,MSW:S_INT;
00000000 1          END;
00000000 1
00000000 1          LAST_REC = RECORD
00000000 2             PROGNO:S_INT;
00000000 2             FIRSTLINE:S_INT;   (* FIRST LINE # OF EQUAL ADDRESSES *)
00000000 2             LASTLINE:S_INT;    (* LAST LINE # IF EQUAL ADDRESSES *)
00000000 2             NO_END:BOOLEAN;
00000000 2             START_ADDR,
00000000 2             END_ADDR:AR2_INT;
****WARNING ??                    ^508
00000000 1          END;
00000000 1          SOURCE_LINE = ARRAY[0..SOURCESIZE] OF S_INT;
00000000 1          SOURCE_PTR_TYPE = ^SOURCE_LINE;
00000000 1
00000000 1  VAR
00000000 1
00000000 1  $EXTVAR+$
00000000 1  ASM_RBUF:BUFFTYPE;
00000000 1  ASM_INDEX:S_INT;
00000000 1  ASM_SIZE:S_INT;
00000000 1  ASM_RECNO:S_INT;
00000000 1  ASM_DCB_NO:S_INT;
00000000 1  ASM_DCB:S_INT;
00000000 1  LAST_LINE:LAST_REC;
00000000 1  $EXTVAR-$
00000000 1
00000000 1
00000000 1  PROCEDURE P_READ(VAR DCB:DCBTYPE;VAR RBUF:BUFFTYPE;LENGTH:S_INT;VAR ERROR:S_INT);EXTERNAL;
00000000 1  PROCEDURE IOERROR(VAR ERROR:S_INT;VAR DCB:DCBTYPE);EXTERNAL;
00000000 1  PROCEDURE OUTIT(LETTER:CHAR;VALUE:S_INT;BASE:CHAR);EXTERNAL;
00000000 1
00000000 1  PROCEDURE POSITION_ASM(PROGNO,RECNUM:S_INT; VAR ERROR:S_INT);EXTERNAL;
00000000 1
00000000 1  PROCEDURE ASM_INIT(PROGNO:S_INT; VAR ERROR:S_INT);EXTERNAL;
00000000 1
00000000 1  PROCEDURE GET_LAST_LINE(PROGNO:S_INT; VAR ADDRESS:AR2_INT; VAR LINENO,ERROR:S_INT);EXTERNAL;
00000000 1
00000000 1  PROCEDURE NEXT_LINE(VAR NUMBER:AR2_INT; VAR LINENO:S_INT; VAR ERROR:S_INT);EXTERNAL;
00000000 1
00000000 1  $CALL_ABS_LONG$
00000000 1  PROCEDURE P_ADDR(INVAL:AR2_INT; VAR OUTVAL:AR2_INT);EXTERNAL;
00000000 1  $CALL_PC_SHORT$
00000000 1
00000000 1  PROCEDURE FLIP_DOUBLE(INVAL:DOUBLE_WORD; VAR OUTVAL:DOUBLE_WORD);EXTERNAL;
00000000 1
00000000 1
00000000 1
00000000 1  PROCEDURE FIND_FIRST(PROGNO:S_INT; VAR LINENO:S_INT; VAR LAST_LINE:LAST_REC);
00000000 2  (*************************************************************************************
00000000 2  IF THE LOCATION THE SEARCH WAS STARTED FROM WAS IN THE MIDDLE OF A LINE
00000000 2  THEN IT IS POSSIBLE THAT THE FIRST LINE THAT WAS RETRIEVED BY LN_HANDLER
00000000 2  IS NOT REALLY THE FIRST LINE.  THIS ROUTINE CHECKS THIS CONDITION AND
00000000 2  UPDATES LINENO AND THE LAST_LINE RECORD ACCORDINGLY.
```

```
00000000 2  *********************************************************************)
00000000 2  VAR
00000000 2    OLD_INDEX:S_INT;
00000002 2    OLD_RECNO:S_INT;
00000004 2    ERROR:S_INT;
00000006 2    DONE:BOOLEAN;
00000007 2    SAVE_NUMBER:S_INT;
0000000A 2    ADDRESS:AR2_INT;
0000000E 2    NUMBER:S_INT;
00000004 2
00000004 2
00000004 2  BEGIN
00000004 2
00000004 2  OLD_INDEX:=ASM_INDEX;
0000000A 2  OLD_RECNO:=ASM_RECNO;
00000010 2  SAVE_NUMBER:=0;
00000014 2  IF ASM_RECNO > 1
00000020 2    THEN
00000020 2      BEGIN  (* NOT AT FIRST RECORD *)
00000020 2      POSITION_ASM(PROGNO,ASM_RECNO-1,ERROR);
00000032 2      ASM_INDEX:=RECSIZE+1;  (* SET THE INDEX SO GET_LAST_LINE WILL RETURN THE LAST IN THE RECORD *)
00000038 2      DONE:=FALSE;
0000003C 2      WHILE (NOT DONE) AND (ERROR = 0) DO
00000054 2        BEGIN  (* LOOKING FOR THE FIRST *)
00000054 2        GET_LAST_LINE(PROGNO,ADDRESS,NUMBER,ERROR);
0000006E 2        P_ADDR(ADDRESS,ADDRESS);
0000007E 2        IF ERROR = 0
00000086 2          THEN
00000086 2            IF UNSIGNED_32(ADDRESS) <> UNSIGNED_32(LAST_LINE.START_ADDR)
00000096 2              THEN
00000096 2                BEGIN  (* FOUND AN ADDRESS NOT THE SAME *)
00000096 2                DONE:=TRUE;
0000009C 2                END  (* FOUND AN ADDRESS NOT THE SAME *)
000000A0 2              ELSE
000000A0 2                BEGIN  (* SAME ADDRESS FOUND *)
000000A0 2                SAVE_NUMBER:=NUMBER;
000000A6 2                OLD_INDEX:=ASM_INDEX;
000000AC 2                OLD_RECNO:=ASM_RECNO;
000000B2 2                END;  (* SAME ADDRESS FOUND *)
000000B2 2        END;  (* LOOKING FOR THE FIRST *)
000000B4 2      END;  (* NOT AT FIRST RECORD *)
000000B4 2
000000B4 2  IF SAVE_NUMBER <> 0
000000BC 2    THEN
000000BC 2      BEGIN  (* WE SAW ADDRESSES THAT WERE THE SAME *)
000000BC 2      LINENO:=SAVE_NUMBER;
000000C4 2      LAST_LINE.FIRSTLINE:=LINENO;
000000D0 2      END;  (* WE SAW ADDRESSES THAT WERE THE SAME *)
000000D0 2
000000D0 2  IF ASM_RECNO <> OLD_RECNO
000000DC 2    THEN
000000DC 2      POSITION_ASM(PROGNO,OLD_RECNO,ERROR);
000000EE 2  ASM_INDEX:=OLD_INDEX;
000000F4 2
000000F4 2  END;  (* FIND_FIRST *)
00000000 1
00000000 1  $GLOBPROC+$
00000000 1
00000000 1  PROCEDURE LN_HANDLER(PROGNO:S_INT; ADDRESS:AR2_INT; FIRST:BOOLEAN; VAR START_ADDR,END_ADDR:AR2_INT;
00000000 2                      VAR LINENO,ERROR:S_INT);
00000000 2  (*********************************************************************
00000000 2  *THIS PROCEDURE RETURNS THE LINE NUMBER THAT
00000000 2  *CONTAINS THE LINE, GIVEN AN ADDRESS WITHIN THE LINE.  IT RETURNS THE
00000000 2  *FOLLOWING ERRORS
00000000 2  *
00000000 2  * PROG_NOT_FOUND = 26;
00000000 2  * NO_SUPPORT = 32;
00000000 2  * NOT_FOUND = 25;
00000000 2  * BAD_ASM_SYM = 34;
00000000 2  * NORMAL FILE MANAGER ERRORS WITH STATUS MESSAGE
00000000 2  *********************************************************************)
00000000 2
00000000 2  LABEL 10;
```

```
00000000  2
00000000  2
00000000  2
00000000  2
00000000  2  VAR
00000000  2    FOUND:BOOLEAN;
00000001  2    LESS_THAN:BOOLEAN;
00000002  2    RESTART:BOOLEAN;
00000003  2    NEXT:S_INT;
00000006  2    NUMBER:AR2_INT;
0000000A  2    LAST_INDEX:S_INT;
0000000C  2    LAST_RECNO:S_INT;
0000000E  2    LAST_SIZE:S_INT;
00000010  2    SAME_ADDR:AR2_INT;
00000014  2    CHECK_INDEX:S_INT;
00000016  2    SAVE_INDEX:S_INT;
00000018  2    SAVE_CHECK:S_INT;
000000FC  2
000000FC  2
000000FC  2
000000FC  2  BEGIN
000000FC  2
000000FC  2  ASM_INIT(PROGNO,ERROR);
0000010C  2  IF ERROR <> 0 THEN GOTO 10;
0000011A  2  LESS_THAN:=FALSE;
0000011E  2  FOUND:=FALSE;
00000122  2  RESTART:=FALSE;
00000126  2  LINENO:=0;
0000012C  2  SAME_ADDR[0]:=0;
00000130  2  SAME_ADDR[1]:=0;
00000134  2  IF (LAST_LINE.FIRSTLINE <> 0 )
00000134  2     AND (UNSIGNED_32(ADDRESS) >= UNSIGNED_32(LAST_LINE.START_ADDR))
00000134  2     AND ((UNSIGNED_32(ADDRESS) < UNSIGNED_32(LAST_LINE.END_ADDR))
00000134  2          OR (LAST_LINE.NO_END))
00000134  2     AND (LAST_LINE.PROGNO = PROGNO)
00000172  2       THEN
00000172  2          BEGIN    (* LINE SAME AS LAST LINE *)
00000172  2          LINENO:=LAST_LINE.FIRSTLINE;
0000017A  2          FOUND:=TRUE;
00000180  2          END      (* LINE SAME AS LAST LINE *)
00000184  2       ELSE
00000184  2          BEGIN  (* HAVE TO FIND IT *)
00000184  2          ASM_INDEX:=2;    (* START EACH SEARCH AT THE BEGINING OF A RECORD *)
0000018A  2                           (* THIS INSURES THAT THE WHOLE RECORD IS LOOKED AT *)
0000018A  2          WHILE (ERROR = 0) AND (NOT FOUND) DO
000001A4  2            BEGIN     (* LOOKING FOR THE ADDRESS *)
000001A4  2            CHECK_INDEX:=ASM_INDEX;
000001AA  2            NEXT_LINE(NUMBER,NEXT,ERROR);
000001C2  2            P_ADDR(NUMBER,NUMBER);
000001D2  2            IF ERROR = 0
000001DC  2               THEN
000001DC  2                 BEGIN   (* WE HAVE A LINE *)
000001DC  2                 IF UNSIGNED_32(NUMBER) > UNSIGNED_32(ADDRESS)
000001E8  2                    THEN
000001E8  2                      BEGIN   (* COULD BE A BRACKET *)
000001E8  2                      IF LESS_THAN
000001F0  2                         THEN
000001F0  2                           BEGIN  (* IT IS A BRACKET *)
000001F0  2                   (* MUST BACKUP THE THE ENTRY IMMEDIATLY FOLLOWING
000001F0  2                      THE ONE WE FOUND SO GET_NEXT_LINE WILL WORK  *)
000001F0  2                           IF ASM_RECNO <> LAST_RECNO
000001FC  2                              THEN
000001FC  2                                BEGIN  (* BACKUP THE FILE *)
000001FC  2                                POSITION_ASM(PROGNO,LAST_RECNO,ERROR);
00000210  2                                IF ERROR <> 0 THEN GOTO 10;
0000021E  2                                END;   (* BACKUP THE FILE *)
0000021E  2                           ASM_INDEX:=LAST_INDEX;
00000224  2                           ASM_SIZE:=LAST_SIZE;
0000022A  2                           FOUND:=TRUE;
00000230  2                           LAST_LINE.END_ADDR:=NUMBER;   (* RECORD THE LAST LINES ADDRESS RANGE *)
00000236  2                           LAST_LINE.NO_END:=FALSE;      (* AND MARK IT AS HAVING ONE *)
0000023A  2                           IF SAVE_CHECK = 2
00000246  2                              THEN FIND_FIRST(PROGNO,LINENO,LAST_LINE);
0000025E  2                           END    (* IT IS A BRACKET *)
```

```
00000262  2                       ELSE
00000262  2                         BEGIN  (* WE ARE TOO FAR IN ASM_FILE SO BACKUP *)
00000262  2                         IF NOT RESTART  (* HAVE WE BEEN THROUGH THE FILE ONCE *)
0000026A  2                           THEN
0000026A  2                             BEGIN  (* NO SO GO BACK A RECORD *)
0000026A  2                             IF ASM_RECNO > 1
00000276  2                               THEN
00000276  2                                 BEGIN  (* WE CAN BACKUP *)
00000276  2                                 POSITION_ASM(PROGNO,ASM_RECNO-1,ERROR);
0000028A  2                                 END    (* WE CAN BACKUP *)
0000028E  2                               ELSE
0000028E  2                                 ERROR:=NOT_FOUND;
00000296  2                             END    (* NO SO GO BACK A RECORD *)
0000029A  2                           ELSE
0000029A  2                             ERROR:=NOT_FOUND;   (* WE'VE LOOKED AT IT ALL *)
000002A2  2                         END ;  (* WE ARE TOO FAR IN ASM_FILE SO BACKUP *)
000002A2  2                     END   (* COULD BE A BRACKET *)
000002A6  2                   ELSE
000002A6  2                     BEGIN  (* FOUND A LINE ADDRESS LESS OR EQUAL THEN WHAT WE WANT *)
000002A6  2                     IF SAME_ADDR <> NUMBER
000002B2  2                       THEN
000002B2  2                         BEGIN  (* THE ADDRESS DID CHANGE *)
000002B2  2                         LAST_LINE.PROGNO:=PROGNO;
000002B8  2                         LINENO:=NEXT;            (* INDICATE WE FOUND A POSSIBLE LINE *)
000002C0  2                         LAST_LINE.FIRSTLINE:=NEXT;
000002C6  2                         LAST_LINE.START_ADDR:=NUMBER;
000002CC  2                         LAST_INDEX:=ASM_INDEX;
000002D2  2                         LAST_RECNO:=ASM_RECNO;
000002D8  2                         LAST_SIZE:=ASM_SIZE;
000002DE  2                         SAME_ADDR:=NUMBER;
000002E4  2                         SAVE_CHECK:=CHECK_INDEX;
000002EA  2                         RESTART:=TRUE;  (* DON'T WANT TO RESTART SINCE WE FOUND AN ENTRY *)
000002F0  2                         END;    (* THE ADDRESS DID CHANGE *)
000002F0  2                     LAST_LINE.LASTLINE:=NEXT;
000002F6  2                     LESS_THAN:=TRUE;
000002FC  2                     END;  (* FOUND A LINE ADDRESS LESS OR EQUAL THEN WHAT WE WANT *)
000002FC  2               END   (* WE HAVE A LINE *)
00000300  2             ELSE
00000300  2               BEGIN  (* GET NEXT RECORD *)
00000300  2               P_READ(ASM_DCB,ASM_RBUF,RECSIZE,ERROR);
0000031C  2               IF ERROR > 1 THEN IO_ERROR(ERROR,ASM_DCB);
0000033E  2               IF ERROR = 1
0000034C  2                 THEN
0000034C  2                   BEGIN
0000034C  2                   IF NOT RESTART
00000354  2                     THEN
00000354  2                       BEGIN   (* MAKE SURE WE HAVE A COMPLETE PASS *)
00000354  2                       POSITION_ASM(PROGNO,1,ERROR);
00000368  2                       RESTART:=TRUE;
0000036E  2                       END;     (* MAKE SURE WE HAVE A COMPLETE PASS *)
0000036E  2                   END
00000372  2                 ELSE
00000372  2                   BEGIN  (* A VALID READ *)
00000372  2                   ASM_RECNO:=ASM_RECNO+1;
00000376  2                   ASM_INDEX:=2;    (* SKIP THE TYPE WORD *)
0000037C  2                   ASM_SIZE:=SHIFT(SHIFT(ASM_RBUF[0],8),-8)-1; (* DON'T COUNT THE CHECK SUM  *)
0000038A  2                   END;     (* A VALID READ *)
0000038A  2               END;   (* GET NEXT RECORD *)
0000038A  2         END;               (* LOOKING FOR THE ADDRESS *)
0000038E  2       END;   (* HAVE TO FIND IT *)
0000038E  2
0000038E  2  IF NOT FOUND THEN
00000396  2    BEGIN
00000396  2    IF LINENO = 0
000003A0  2      THEN ERROR:=NOT_FOUND
000003AC  2      ELSE
000003AC  2        BEGIN   (* ADDRESS IS BIGGER THAN LAST LINE NUMBER SO USE IT *)
000003AC  2        ERROR:=0;
000003B2  2        LAST_LINE.NO_END:=TRUE;
000003B8  2        END;      (* ADDRESS IS BIGGER THAN LAST LINE NUMBER *)
000003B8  2    END
000003BC  2    ELSE ERROR:=0;
000003C2  2
000003C2  2  IF NOT FIRST
```

```
000003CA  2     THEN  LINENO:=LAST_LINE.LASTLINE;     (* LINENO HAS FIRST LINE, SO IF NOT FIRST GET LAST *)
000003D2  2  START_ADDR:=LAST_LINE.START_ADDR;
000003DA  2  IF LAST_LINE.NO_END
000003E2  2    THEN
000003E2  2       BEGIN  (* NO ENDING ADDRESS *)
000003E2  2       END_ADDR[0]:=0;
000003E8  2       END_ADDR[1]:=0;
000003F0  2       END    (* NO ENDING ADDRESS *)
000003F4  2    ELSE
000003F4  2       END_ADDR:=LAST_LINE.END_ADDR;
000003FC  2
000003FC  2
000003FC  2  10:
000003FC  2
000003FC  2
000003FC  2  END;      (* LN_HANDLER *)
00000000  1

508: Warning: field or entry alignment; record or array comparisons may not work

End of compilation, number of errors=    0

00000000  1  "68000"  PREPROCESS
00000000  1  $EXTENSIONS ON$
00000000  1  PROGRAM LINE_NUMBER_HANDLER;
00000000  1  CONST
00000000  1            SOURCESIZE = 119;
00000000  1            RECSIZE = 128;
00000000  1
00000000  1  #INCLUDE ERROR:INCLUD
00000000  1
00000000  1  TYPE
00000000  1            S_INT = SIGNED_16;
00000000  1            US_INT = UNSIGNED_16;
00000000  1            AR8_INT = ARRAY[0..7] OF S_INT;
00000000  1            AR2_INT = ARRAY[0..1] OF S_INT;
00000000  1            BUFFTYPE = ARRAY[0..128] OF S_INT;
00000000  1            PTRTYPE = ^S_INT;
00000000  1            LITTLE_PTR = ^BYTE;
00000000  1            DCBTYPE =  S_INT;
00000000  1            NAMETYPE = ARRAY[0..7] OF S_INT;
00000000  1            NAMEPTR = ^NAMETYPE;
00000000  1            DCBPTR = ^DCBTYPE;
00000000  1            BUFFPTR = ^BUFFTYPE;
00000000  1            ARRAYTYPE = ARRAY [0..15] OF S_INT;
00000000  1            ARRAYPTR = ^ARRAYTYPE;
00000000  1            DOUBLE_WORD = RECORD
00000000  2               LSW,MSW:S_INT;
00000000  1            END;
00000000  1
00000000  1            LAST_REC = RECORD
00000000  2               PROGNO:S_INT;
00000000  2               FIRSTLINE:S_INT;   (* FIRST LINE # OF EQUAL ADDRESSES *)
00000000  2               LASTLINE:S_INT;    (* LAST LINE # IF EQUAL ADDRESSES *)
00000000  2               NO_END:BOOLEAN;
00000000  2               START_ADDR,
00000000  2               END_ADDR:AR2_INT;
****WARNING ??                     ^508
00000000  1            END;
00000000  1            SOURCE_LINE = ARRAY[0..SOURCESIZE] OF S_INT;
00000000  1            SOURCE_PTR_TYPE = ^SOURCE_LINE;
00000000  1
00000000  1  VAR
00000000  1
00000000  1  $EXTVAR+$
00000000  1  ASM_INDEX:S_INT;
00000000  1  ASM_SIZE:S_INT;
00000000  1  ASM_RECNO:S_INT;
00000000  1  $EXTVAR-$
00000000  1
00000000  1
00000000  1  PROCEDURE OUTIT(LETTER:CHAR;VALUE:S_INT;BASE:CHAR);EXTERNAL;
00000000  1
00000000  1  PROCEDURE PROC_FNAME(PROGNO:S_INT; VAR FNAME:NAMEPTR; VAR DISC,PROCID,ERROR:S_INT);EXTERNAL;
00000000  1
00000000  1  PROCEDURE SCLN_FETCH(PROGNO,LINENO:S_INT; SCLN:SOURCE_PTR_TYPE;
00000000  2                          VAR SIZE,ERROR:S_INT);EXTERNAL;
```

```
00000000  1
00000000  1  FUNCTION SCAN_IT(LANG:S_INT; SCLN:SOURCE_PTR_TYPE; SIZE:S_INT; SYM:NAMEPTR):BOOLEAN;EXTERNAL;
00000000  1
00000000  1  PROCEDURE POSITION_ASM(PROGNO,RECNUM:S_INT; VAR ERROR:S_INT);EXTERNAL;
00000000  1
00000000  1  PROCEDURE GET_NEXT_LINE(VAR ADDRESS:AR2_INT; VAR LINENO,ERROR:S_INT);EXTERNAL;
00000000  1
00000000  1  $CALL_ADS_LONG$
00000000  1  PROCEDURE P_ADDR(INVAL:AR2_INT; VAR OUTVAL:AR2_INT);EXTERNAL;
00000000  1  $CALL_PC_SHORT$
00000000  1
00000000  1  PROCEDURE FLIP_DOUBLE(INVAL:DOUBLE_WORD; VAR OUTVAL:DOUBLE_WORD);EXTERNAL;
00000000  1
00000000  1
00000000  1  PROCEDURE LN_HANDLER(PROGNO:S_INT; ADDRESS:AR2_INT; FIRST:BOOLEAN; VAR START_ADDR,END_ADDR:AR2_INT,
00000000  2                     VAR LINENO,ERROR:S_INT);EXTERNAL;
00000000  1
00000000  1  $GLOBPROC+$
00000000  1
00000000  1  PROCEDURE LN_FETCHER(PROGNO,LANG,EMULID:S_INT; SYM:NAMEPTR; ADDRESS:AR2_INT:
00000000  2                     SCLN:SOURCE_PTR_TYPE; VAR LINENO,SIZE,ERROR:S_INT);
00000000  2
00000000  2  (*****************************************************************************
00000000  2  *THIS PROCEDURE FINDS THE SOURCE CODE STRING CORRESPONDING TO SOME .
00000000  2  *ADDRESS   PROGNO IS THE PROGRAM NUMBER, SYM IS THE EXPECTED
00000000  2  *SYMBOL NAME TO FIND IN THE SOURCE CODE ( FOR PREFETCH ENVIROMENT ),
00000000  2  *ADDRESS IS THE ADDRESS OF THE SOURCE REQUESTED AND SCLN IS THE
00000000  2  *POINTER TO THE SOURCE LINE.  SIZE IS THE NUMBER OR CHARS. LINENO IS THE LINE
00000000  2  *NUMBER.
00000000  2  *
00000000  2  *  IT IS THE CALLERS RESPONSIBLITY TO HAVE SCLN POINT TO A 120 WORD
00000000  2  *  BUFFER
00000000  2  *
00000000  2  *
00000000  2  *ERROR CODES
00000000  2  *
00000000  2  * PROG_NOT_FOUND = 26;
00000000  2  * NO_SUPPORT = 32;
00000000  2  * NOT_FOUND = 25;
00000000  2  * NO_SYM = 33;
00000000  2  * BAD_ASM_SYM = 34;
00000000  2  *     .
00000000  2  *    PLUS THE NORMAL FILE MANAGER ERRORS   (WITH STATUS MESSAGE)
00000000  2  *
00000000  2  *****************************************************************************)
00000000  2  LABEL 10;
00000000  2
00000000  2  VAR
00000000  2    FOUND,PREFETCH:BOOLEAN;
00000002  2    CH_ADDR,INC:INTEGER;
0000000A  2    NEXT_LINENO:S_INT;
0000000C  2    LAST_INDEX,LAST_SIZE,LAST_RECNO:S_INT;
00000012  2    START_ADDR,END_ADDR:AR2_INT;
00000004  2
00000004  2   {DEBUG} {I:S_INT; }
00000004  2
00000004  2  BEGIN
00000004  2
00000004  2  {
00000004  2  OUTIT('p',PROGNO,'D');
00000004  2  OUTIT('a',ADDRESS[1],'H');
00000004  2  FOR I:=0 TO 7 DO OUTIT('s',SYM^[I],'H');
00000004  2  }
00000004  2
00000004  2
00000004  2
00000004  2  PREFETCH:=FALSE;
00000008  2  CASE EMULID OF
00000012  2    00F0H: BEGIN   (* 8086 *)
00000017  2           INC:=-6;
0000001A  2           PREFETCH:=TRUE;
00000020  2           END;    (* 8086 *)
00000024  2    00F2H,00F8H,00FAH:
00000024  2           BEGIN   (* 68000,8088,68010 *)
```

```
00000024  2            INC:=-4;
0000002C  2            PREFETCH:=TRUE;
00000032  2            END;    (* 68000,8088,68010 *)
00000036  2     OTHERWISE
00000036  2   END;   (* CASE *)
00000070  2
00000070  2   IF ERROR <> 0 THEN GOTO 10;
0000007E  2   IF PREFETCH
00000086  2      THEN CH_ADDR:=INTEGER(ADDRESS)+(INC)
00000096  2      ELSE CH_ADDR:=INTEGER(ADDRESS);
0000009C  2   LN_HANDLER(PROGNO,AR2_INT(CH_ADDR).TRUE,START_ADDR,END_ADDR,LINENO,ERROR);
000000C6  2   LAST_INDEX:=ASM_INDEX;
000000CC  2   LAST_SIZE:=ASM_SIZE;
000000D2  2   LAST_RECNO:=ASM_RECNO;
000000D8  2   IF ERROR = NOT_FOUND
000000E6  2     THEN
000000E6  2        BEGIN  (* NO LINE FOUND THIS FAR BACK IN PREFETCH QUEUE *)
000000E6  2        FOUND:=FALSE.
000000EA  2        ERROR.=0;
000000F0  2        END    (* NO LINE FOUND THIS FAR BACK IN PREFETCH QUEUE *)
000000F4  2     ELSE
000000F4  2        IF ERROR = 0
000000FE  2           THEN
000000FE  2              BEGIN  (* FOUND A LINE *)
000000FE  2              SCLN_FETCH(PROGNO,LINENO,SCLN,SIZE,ERROR);
00000122  2              FOUND:=SCAN_IT(LANG,SCLN,SIZE,SYM);
00000142  2              END;   (* FOUND A LINE *)
00000142  2   WHILE (NOT FOUND) AND (ERROR = 0) DO
0000015C  2      BEGIN   (* CHECKING FOR VALITITY *)
0000015C  2      GET_NEXT_LINE(AR2_INT(CH_ADDR),NEXT_LINENO,ERROR);
00000174  2      (****  CONVERT ADDRESS FROM GET_NEXT_LINE TO PHYSICAL ADDRESS *)
00000174  2      P_ADDR(AR2_INT(CH_ADDR),AR2_INT(CH_ADDR));
00000184  2      IF (UNSIGNED_32(CH_ADDR) > UNSIGNED_32(ADDRESS)) OR (ERROR <> 0)
000001A4  2         THEN
000001A4  2            BEGIN   (* OUTSIDE OF PREFETCH *)
000001A4  2            IF LINENO = 0     (* IF WE DID NOT FIND ANY LINES, LN_HANDLE SET IT TO 0 *)
000001AE  2               THEN ERROR:=NOT_FOUND
000001BA  2               ELSE ERROR:=NO_SYM;
000001C2  2            END     (* OUTSIDE OF PREFETCH *)
000001C6  2         ELSE
000001C6  2            BEGIN   (* WITHIN PREFETCH QUEUE *)
000001C6  2            LINENO:=NEXT_LINENO;
000001CE  2            SCLN_FETCH(PROGNO,LINENO,SCLN,SIZE,ERROR);
000001F2  2            FOUND:=SCAN_IT(LANG,SCLN,SIZE,SYM);
00000212  2            END,    (* WITHIN PREFETCH QUEUE *)
00000212  2     END;   (* CHECKING FOR VALITITY *)
00000216  2   IF LAST_RECNO <> ASM_RECNO
00000222  2     THEN
00000222  2        BEGIN  (* MOVE THE FILE BACK *)
00000222  2        POSITION_ASM(PROGNO,LAST_RECNO,ERROR);
00000234  2        IF ERROR <> 0 THEN GOTO 10;
00000242  2        END;   (* MOVE THE FILE BACK *)
00000242  2   ASM_INDEX:=LAST_INDEX;
00000248  2   ASM_SIZE:=LAST_SIZE,
0000024E  2
0000024E  2   10:
0000024E  2
0000024E  2   {
0000024E  2   OUTIT('e',ERROR,'D');
0000024E  2   OUTIT('l',LINENO,'D');
0000024E  2   }
0000024E  2
0000024E  2   END;   (* LN_FETCHER *)
00000000  1   .

508: Warning: field or entry alignment; record or array comparisons may not work

End of compilation, number of errors=    0

00000000  1   "68000"
00000000  1   $EXTENSIONS ON$
00000000  1   PROGRAM SCAN;
00000000  1
00000000  1   CONST
```

```
00000000  1          C_LANG = 1;
00000000  1
00000000  1  TYPE
00000000  1           S_INT = SIGNED_16;
00000000  1           POINTER = ^S_INT;
00000000  1           NAMETYPE = ARRAY[0..31] OF CHAR;
00000000  1           NAMEPTR = ^NAMETYPE;
00000000  1           SOURCE = ARRAY[0..239] OF CHAR;
00000000  1           SOURCE_PTR = ^SOURCE;
00000000  1           DEL_REC = RECORD
00000000  2             SIZE:S_INT;
00000000  2             TAB:ARRAY[1..23] OF CHAR;
****WARNING ??                          ^508
00000000  1           END;
00000000  1
00000000  1  VAR
00000000  1
00000000  1  $FAR ON$
00000000  1  $EXTVAR+$
00000000  1  DEL_TAB:DEL_REC;
00000000  1  $EXTVAR-$
00000000  1  $FAR OFF$
00000000  1
00000000  1
00000000  1  PROCEDURE OUTIT(LETTER:CHAR;VALUE:S_INT;BASE:CHAR);EXTERNAL;
00000000  1
00000000  1
00000000  1  FUNCTION COMPAREIDENT(IDENT1,IDENT2:NAMEPTR):BOOLEAN;EXTERNAL;
00000000  1
00000000  1
00000000  1  $GLOBPROC+$
00000000  1  FUNCTION SCAN_IT(LANG:INTEGER; LINE:SOURCE_PTR; SIZE:S_INT; SYM:NAMEPTR):BOOLEAN;
00000000  2  (*******************************************************************
00000000  2  THIS PROCEDURE SCANS A SOURCE LINE LOOKING FOR A PARTICULAR SYMBOL
00000000  2  *******************************************************************)
00000000  2
00000000  2
00000000  2  CONST
00000000  2    BLANK = 20H;
00000000  2    P_COMMENT1 = '(';
00000000  2    P_COMMENT2 = '*';
00000000  2    P_COMMENT3 = '{';
00000000  2    P_COMMENT1_END = ')';
00000000  2    P_COMMENT2_END = '*';
00000000  2    P_COMMENT3_END = '}';
00000000  2    C_COMMENT1 = '/';
00000000  2    C_COMMENT2 = '*';
00000000  2    NOT_USED = CHAR(0FFH);
00000000  2    NULL_CHAR = CHAR(0);
00000001  2
00000001  2  VAR
00000001  2    COMMENT1:CHAR;
00000002  2    COMMENT2:CHAR;
00000003  2    COMMENT3:CHAR;
00000004  2    COMMENT1_END:CHAR;
00000005  2    COMMENT2_END:CHAR;
00000006  2    COMMENT3_END:CHAR;
00000007  2    INDEX:S_INT;
0000000A  2    CH:CHAR;
0000000B  2    DONE,FOUND:BOOLEAN;
0000000D  2    IDPTR:NAMEPTR;
00000012  2    IDENT:NAMETYPE;
00000000  2
00000000  2
00000000  2
00000000  2  FUNCTION GET_CH:CHAR;
00000004  3  (***********************************************************************
00000004  3  THIS PROCEDURE GETS THE NEXT CHAR FROM THE LINE.  IF THE LINE IS
00000004  3  EMPTY IT WILL RETURN A CHAR OF VALUE 0.
00000004  3  ***********************************************************************)
00000004  3
00000004  3  BEGIN
00000004  3
00000004  3  IF INDEX <= SIZE
```

```
00000014  3      THEN
00000014  3        BEGIN
00000014  3        GET_CH:=LINE^[INDEX];
0000001E  3        INDEX:=INDEX+1;
00000022  3        END
00000026  3      ELSE GET_CH:=NULL_CHAR;
0000002A  3
0000002A  3  END; (* GET_CH *)
00000000  2
00000000  2
00000000  2  FUNCTION NEXT_CH:CHAR;
00000001  3  (****************************************************************************
00000001  3  THIS PROCEDURE GETS THE NEXT NON BLANK CHAR
00000001  3  ****************************************************************************)
00000001  3
00000001  3  VAR
00000001  3    CH:CHAR;
00000038  3
00000038  3  BEGIN
00000038  3
00000038  3  CH:=GET_CH;
00000044  3  WHILE CH = ' ' DO
00000050  3    BEGIN
00000050  3    CH:=GET_CH;
0000005C  3    END;
0000005E  3  NEXT_CH:=CH;
00000064  3
00000064  3  END;   (* NEXT_CH *)
00000000  2
00000000  2
00000000  2  PROCEDURE COMMENT(DOUBLE:BOOLEAN);
00000000  3  (*****************************************************************
00000000  3  THIS PROCEDURE ADVANCES INDEX TO THE END OF A COMMENT
00000000  3  *****************************************************************)
00000000  3
00000000  3  VAR
00000000  3    END_OF_C:BOOLEAN;
00000001  3    CH:CHAR;
00000072  3
00000072  3  BEGIN
00000072  3
00000072  3  IF DOUBLE THEN
0000007A  3    BEGIN   (* FIND THE END OF DOUBLE COMMENT *)
0000007A  3    END_OF_C:=FALSE;
0000007E  3    WHILE (NOT END_OF_C) DO
00000086  3       BEGIN
00000086  3       CH:=NEXT_CH;
00000092  3       IF CH = NULL_CHAR THEN END_OF_C:=TRUE;
000000A0  3       IF CH =COMMENT2_END THEN
000000B0  3          BEGIN
000000B0  3          CH:=GET_CH;
000000BE  3          IF (CH = COMMENT1_END) OR (CH = NULL_CHAR) THEN END_OF_C:=TRUE;
000000E4  3          END;
000000E4  3       END;
000000E6  3    END      (* FIND THE END OF A DOUBLE COMMENT *)
000000EA  3    ELSE
000000EA  3       BEGIN  (* SINGLE TYPE COMMENT *)
000000EA  3       CH:=NEXT_CH;
000000F8  3       WHILE (CH <> COMMENT3_END) AND (CH <> NULL_CHAR) DO
00000118  3         CH:=NEXT_CH;
00000128  3       END;   (* SINGLE TYPE COMMENT *)
00000128  3
00000128  3  END;  (* COMMENT *)
00000000  2
00000000  2  FUNCTION DELIMITER(CH:CHAR):BOOLEAN;
00000001  3  (*****************************************************************
00000001  3  THIS FUNCTION RETURNS TRUE IF CH IS A DELIMITER
00000001  3  *****************************************************************)
00000001  3  VAR
00000001  3    I:S_INT;
00000004  3    FOUND:BOOLEAN;
00000130  3
00000130  3  BEGIN
00000130  3
```

```
00000130  3  I:=1;
00000136  3  FOUND:=FALSE;
0000013A  3  WHILE (I <= DEL_TAB.SIZE) AND (NOT FOUND) DO
00000158  3    BEGIN
00000158  3    IF CH = DEL_TAB.TAB[I]
0000016C  3       THEN FOUND:=TRUE
00000176  3       ELSE I:=I+1;
0000017A  3    END;
0000017C  3  DELIMITER:=FOUND;
00000182  3
00000182  3  END;  (* DELIMITER *)
00000000  2
00000000  2
00000000  2
00000000  2  FUNCTION ADVANCE:CHAR;
00000001  3  (***************************************************************
00000001  3  THIS FUNCTION ADVANCES THE INDEX TO THE NEXT KEYWORD OR
00000001  3  IDENTIFIER IN THE PASCAL SOURCE AND RETURNS ITS FIRST CHAR
00000001  3  ***************************************************************)
00000001  3
00000001  3  VAR
00000001  3    CH:CHAR;
00000190  3
00000190  3
00000190  3  BEGIN
00000190  3
00000190  3  CH:=NEXT_CH;
0000019E  3  WHILE (DELIMITER(CH)) DO
000001B0  3    BEGIN  (* FILTERING OUT GARBAGE *)
000001B0  3    IF CH = COMMENT1 THEN
000001C0  3       BEGIN     (* A DOUBLE COMMENT *)
000001C0  3       CH:=GET_CH;
000001CE  3       IF CH = COMMENT2 THEN
000001DE  3          BEGIN
000001DE  3          COMMENT(TRUE);
000001EC  3          CH:=NEXT_CH;
000001FA  3          END;
000001FA  3       END     (* A DOUBLE COMMENT *)
000001FE  3       ELSE
000001FE  3          IF CH =COMMENT3 THEN
0000020E  3          BEGIN
0000020E  3          COMMENT(FALSE);
0000021A  3          CH:=NEXT_CH;
00000228  3          END
0000022C  3          ELSE
0000022C  3             IF CH = '$' THEN
00000238  3             BEGIN     (* COMPILER OPTION *)
00000238  3             CH:=GET_CH;
00000246  3             WHILE CH <> '$' DO
00000252  3                 CH:=GET_CH;
00000262  3             CH:=GET_CH;
00000270  3             END       (* COMPILER OPTION *)
00000274  3             ELSE
00000274  3                CH:=NEXT_CH;
00000282  3    END;        (* FILTERING OUT GARBAGE *)
00000286  3  ADVANCE:=CH;
0000028C  3
0000028C  3  END;    (* ADVANCE *)
00000000  2
00000000  2
00000000  2  PROCEDURE GET_NEXT(NEXT:NAMEPTR; VAR EOL:BOOLEAN);
00000000  3  (*******************************************************************************
00000000  3  THIS PROCEDURE GETS THE NEXT IDENTIFIER
00000000  3  *******************************************************************************)
00000000  3
00000000  3  VAR
00000000  3    DONE:BOOLEAN;
00000001  3    I:BYTE;
00000002  3    CH:CHAR;
0000029A  3
0000029A  3  BEGIN
0000029A  3
0000029A  3  EOL:=FALSE;
000002A0  3  DONE:=FALSE;
```

```
000002A4  3  WHILE NOT DONE DO
000002AC  3    BEGIN (* LOOKING FOR AN IDENTIFIER *)
000002AC  3    CH:=ADVANCE;
000002BA  3    IF ((ORD(CH) >= ORD('A')) AND (ORD(CH) <= ORD('Z')))
000002BA  3       OR ((ORD(CH) >= ORD('a')) AND (ORD(CH) <= ORD('z')))
0000030C  3      THEN
0000030C  3         BEGIN  (* AN IDENTIFIER *)
0000030C  3         DONE:=TRUE;
00000312  3         I:=2;
00000318  3         NEXT^[1]:=CH;
00000322  3         CH:=GET_CH;
00000330  3         WHILE (NOT DELIMITER(CH)) AND (CH <> NULL_CHAR) DO
00000352  3            BEGIN  (* GET ID *)
00000352  3            IF I <= 31
0000035E  3               THEN
0000035E  3                  BEGIN  (* COPY TO IDENT *)
0000035E  3                  NEXT^[I]:=CH;
00000368  3                  I:=I+1;
0000036E  3                  END;   (* COPY TO IDENT *)
0000036E  3            CH:=GET_CH;
0000037C  3            END;    (* GET ID *)
0000037E  3         IF CH <> NULL_CHAR
00000386  3            THEN INDEX:=INDEX-1;    (* PUT BACK THE LOOKAHEAD CHAR *)
0000038E  3         IF ODD(I)
00000398  3            THEN
00000398  3               BEGIN (* PAD BYTE *)
00000398  3               NEXT^[I]:=' ';
000003A8  3               I:=I+1;
000003AC  3               END;  (* PAD BYTE *)
000003AC  3         I:=I-2;
000003B0  3         NEXT^[0]:=CHAR(SHIFT(I DIV 2,5));
000003C4  3         END   (* AN IDENTIFIER *)
000003C8  3      ELSE
000003C8  3         IF CH = NULL_CHAR
000003D0  3            THEN
000003D0  3               BEGIN  (* END OF LINE *)
000003D0  3               DONE:=TRUE;
000003D6  3               EOL:=TRUE;
000003DE  3               END;
000003DE  3
000003DE  3    END;   (* LOOKING FOR AN IDENIFIER *)
000003E2  3
000003E2  3  END;  (* GET_NEXT *)
00000000  2
00000000  2
00000000  2  FUNCTION IN_COMMENT:BOOLEAN;
00000001  3  (**************************************************************************
00000001  3  THIS PROCEDURE CHECKS TO SEE IF THE CURRENT LINE POSITION IS WITHIN
00000001  3  AN OPEN ENDED COMMENT (IE THIS LINE CONTAINS ONLY THE ENDING COMMENT DELIMITERS
00000001  3  **************************************************************************)
00000001  3
00000001  3  VAR
00000001  3    CH:CHAR;
000003EA  3
000003EA  3  BEGIN
000003EA  3
000003EA  3  IN_COMMENT:=FALSE;
000003EE  3  REPEAT
000003EE  3    CH:=NEXT_CH;
000003FC  3    IF CH = COMMENT2_END
0000040C  3       THEN
0000040C  3          BEGIN  (* POSSIBLE END OF COMMENT *)
0000040C  3          CH:=GET_CH;
0000041A  3          IF CH = COMMENT1_END
0000042A  3             THEN
0000042A  3                BEGIN  (* END OF COMMENT *)
0000042A  3                CH:=NULL_CHAR;
0000042E  3                IN_COMMENT:=TRUE;
00000434  3                END;   (* END OF COMMENT *)
00000434  3          END   (* POSSIBLE END OF COMMENT *)
00000438  3       ELSE
00000438  3          IF CH = COMMENT3_END
00000448  3             THEN
00000448  3                BEGIN  (* END OF COMMENT *)
```

```
00000448  3                 CH:=NULL_CHAR;
0000044C  3                 IN_COMMENT:=TRUE;
00000452  3                 END  (* END OF COMMENT *)
00000456  3               ELSE
00000456  3                 IF CH = COMMENT1
00000466  3                   THEN
00000466  3                     BEGIN  (* POSSIBLE START OF COMMENT *)
00000466  3                     CH:=GET_CH;
00000474  3                     IF CH = COMMENT2
00000484  3                       THEN
00000484  3                         BEGIN  (* START OF COMMENT *)
00000484  3                         CH:=NULL_CHAR;
00000488  3                         END;   (* END OF COMMENT *)
00000488  3                     END   (* POSSIBLE END OF COMMENT *)
0000048C  3                   ELSE
0000048C  3                     IF CH = COMMENT3
0000049C  3                       THEN CH:=NULL_CHAR;
000004A0  3 UNTIL CH = NULL_CHAR;
000004A8  3
000004A8  3 END,   (* IN_COMMENT *)
000004B6  2
000004B6  2   .
000004B6  2 BEGIN     (* SCAN_IT *)
000004B6  2
000004B6  2 IF LANG = C_LANG
000004C4  2   THEN
000004C4  2     BEGIN  (* SETUP COMMENTS FOR C *)
000004C4  2     COMMENT1:=C_COMMENT1;
000004CA  2     COMMENT1_END:=C_COMMENT1;
000004D0  2     COMMENT2:=C_COMMENT2;
000004D6  2     COMMENT2_END:=C_COMMENT2;
000004DC  2     COMMENT3:=NOT_USED;
000004E2  2     COMMENT3_END:=NOT_USED;
000004E8  2     END    (* SETUP COMMENTS FOR C *)
000004EC  2   ELSE
000004EC  2     BEGIN    (* SETUP COMMENTS FOR PASCAL LIKE LANGUAGES *)
000004EC  2     COMMENT1:=P_COMMENT1;
000004F2  2     COMMENT1_END:=P_COMMENT1_END;
000004F8  2     COMMENT2:=P_COMMENT2;
000004FE  2     COMMENT2_END:=P_COMMENT2_END;
00000504  2     COMMENT3:=P_COMMENT3;
0000050A  2     COMMENT3_END:=P_COMMENT3_END;
00000510  2     END;     (* SETUP COMMENTS FOR PASCAL LIKE LANGUAGES *)
00000510  2 DONE:=FALSE;
00000514  2 FOUND:=FALSE;
00000518  2 IDPTR:=ADDR(IDENT);
00000520  2 INDEX:=0;
00000524  2 WHILE NOT DONE DO
0000052C  2   BEGIN  (* LOOKING FOR THE SYMBOL *)
0000052C  2   GET_NEXT(IDPTR,DONE);
00000542  2   IF NOT DONE
0000054A  2     THEN
0000054A  2       BEGIN  (* CHECK IDENT WITH SYM *)
0000054A  2       IF COMPAREIDENT(IDPTR,SYM)
0000055E  2         THEN
0000055E  2           BEGIN  (* FOUND THE SYM *)
0000055E  2           FOUND:=TRUE;
00000564  2           IF IN_COMMENT
00000574  2             THEN FOUND:=FALSE
0000057C  2             ELSE DONE:=TRUE;
00000582  2           END;   (* FOUND THE SYM *)
00000582  2       END;  (* CHECK IDENT WITH SYM *)
00000582  2   END;  (* LOOKING FOR THE SYMBOL *)
00000584  2
00000584  2 SCAN_IT:=FOUND;
0000058A  2
0000058A  2 END;  (* SCAN_IT *)
00000000  1  .

508: Warning: field or entry alignment; record or array comparisons may not work

End of compilation, number of errors=    0
```

```
LOCATION OBJECT CODE LINE     SOURCE LINE

                           "68000"
                                      GLB  DEL_TAB
000000 0017                DEL_TAB    DC.W 23              NUMBER OF DELIMITERS
000002 5E                             ASC  "^"
000003 3A                             ASC  ":"
000004 22                             ASC  ^"^
000005 24                             ASC  "$"
000006 3B                             ASC  ";"
000007 3D                             ASC  "="
000008 3C                             ASC  "<"
000009 3E                             ASC  ">"
00000A 28                             ASC  "("
00000B 29                             ASC  ")"
00000C 5B                             ASC  "["
00000D 5D                             ASC  "]"
00000E 7B                             ASC  "{"
00000F 7D                             ASC  "}"
000010 20                             ASC  " "
000011 2C                             ASC  ","
000012 2B                             ASC  "+"
000013 2D                             ASC  "-"
000014 2A                             ASC  "*"
000015 2F                             ASC  "/"
000016 28                             ASC  "("
000017 29                             ASC  ")"
000018 2E                             ASC  "."

Errors=    0

00000000  1  "68000"
00000000  1  $EXTENSIONS ON$
00000000  1  PROGRAM DATABASE_ERROR;
00000000  1
00000000  1  TYPE
00000000  1           S_INT = SIGNED_16;
00000000  1           POINTER = ^INTEGER;
00000000  1           DCBTYPE = ARRAY[1..145] OF S_INT;
00000000  1           TBL = ARRAY [1..100] OF POINTER;
00000000  1
00000000  1
00000000  1  PROCEDURE P_FILE_ERR(VAR DCB:DCBTYPE;ERROR:S_INT);EXTERNAL;
00000000  1  PROCEDURE OUTIT(LETTER:CHAR; VALUE:S_INT; BASE:CHAR);EXTERNAL;
00000000  1  PROCEDURE P_MESSAGE(MESSPTR:POINTER; CODE:S_INT);EXTERNAL;
00000000  1
00000000  1
00000000  1  $GLOBPROC+$
00000000  1
00000000  1  PROCEDURE IOERROR(VAR ERROR:S_INT;VAR DCB:DCBTYPE);
00000004  2  (*************************************************************
00000004  2  * PURPOSE: OUTPUT AN I/O ERROR ON THE STATUS LINE.
00000004  2  *************************************************************)
00000004  2  BEGIN
00000004  2      P_FILE_ERR(DCB,ERROR);
00000016  2      ERROR:=ERROR+20;    (* ADD 20 TO ERROR SO THE ERRORS WILL NOT BE CONFUSED *)
00000022  2  END;
00000000  1
00000000  1  PROCEDURE DB_ERROR(ERROR:S_INT);
00000000  2  (*************************************************************
00000000  2  THIS PROCEDURE HANDLES THE ERROR MESSAGES FROM THE
00000000  2  DATA BASE.
00000000  2  *************************************************************)
00000000  2  CONST
00000000  2     CODE = 0C000H;
00000000  2
00000000  2  VAR
00000000  2
00000000  2  $FAR$
00000000  2  $EXTVAR+$
00000000  2  DB_TBL:TBL;
00000000  2  $EXTVAR-$
0000000C  2  $FAR OFF$
0000002A  2
0000002A  2  BEGIN
```

```
0000002A  2  P_MESSAGE(DB_TBL[ERROR-9],CODE);
0000004A  2  END;
00000000  1  .

End of compilation, number of errors=    0

                    1 "68000"
000000 FFFF FFFF    2          DC.L      -1

Errors=    0

00000000  1  "68000" PREPROCESS
00000000  1  PROGRAM LOOK_VAR;
00000000  1
00000000  1  $EXTENSIONS ON$
00000000  1  #INCLUDE STD_DATA:SODADB
00000000  1  #INCLUDE SYMBOL:SODADB
00000000  1  #INCLUDE ERROR:INCLUD
00000000  1
00000000  1  #DEFINE VIRTUALINC(P,OFFSET)  BEGIN                    \
00000000  1                                VIRTUAL_INC(P,OFFSET,ERROR);\
00000000  1                                IF ERROR <> 0 THEN GOTO 10;\
00000000  1                                END
00000000  1
00000000  1  CONST
00000000  1    VAR_TYPE = 2;
00000000  1    EXT_OFFSET = 4;
00000000  1    VAR_ADDR_OFFSET = 3;
00000000  1    VAR_OFFSET = 5;
00000000  1    PARM_OFFSET = 3;
00000000  1    NEXT_OFFSET = 6;
00000000  1
00000000  1  TYPE
00000000  1    V_TYPES = (PARM_TYPES,VAR_TYPES);
00000000  1
00000000  1    LOAD_REC = RECORD
00000000  2      PROG,MIN,MAX:AR2_INT;
00000000  1    END;
00000000  1
00000000  1
00000000  1  PROCEDURE PROG_LOAD(PROGNO:S_INT; VAR LOAD:LOAD_REC; VAR ERROR:S_INT);EXTERNAL;
00000000  1
00000000  1  PROCEDURE PROC_INFO(PROGNO,SUBNO:S_INT; VAR P:GENERIC_PTR; VAR ERROR:S_INT);EXTERNAL;
00000000  1
00000000  1
00000000  1  PROCEDURE RELEASE_SUBNO(PROGNO,SUBNO:S_INT);EXTERNAL;
00000000  1
00000000  1  PROCEDURE RELEASE_SYM_SPACE(P:POINTER);EXTERNAL;
00000000  1
00000000  1  PROCEDURE VIRTUAL_INC(VAR P:POINTER; OFFSET:S_INT; VAR ERROR:S_INT);EXTERNAL;
00000000  1
00000000  1  PROCEDURE LEVEL1VAR(PROGNO:S_INT; VAR P:POINTER; VAR ERROR:S_INT);EXTERNAL;
00000000  1
00000000  1  PROCEDURE GET_SYM(DB_PTR:INTEGER; P:POINTER; FLAG:BOOLEAN; VAR SYMTYPE:SYMSET;
00000000  2                   VAR COUNT,ERROR:S_INT);EXTERNAL;
00000000  1
00000000  1  FUNCTION SUB_INDEX(PROGNO,SUBNO:S_INT; VAR NEXT_SUB:S_INT):NODE_PTR;EXTERNAL;
00000000  1
00000000  1  $CALL_ABS_LONG$
00000000  1  PROCEDURE P_ADDR(INVAL:AR2_INT; VAR OUTVAL:AR2_INT);EXTERNAL;
00000000  1  $CALL_PC_SHORT$
00000000  1
00000000  1  PROCEDURE OUTIT(LETTER:CHAR;VALUE:S_INT; BASE:CHAR);EXTERNAL;
00000000  1
00000000  1  FUNCTION CHECK_VAR_LIST(VAR ADDRESS:AR2_INT; VAR P:POINTER; STATIC:BOOLEAN):BOOLEAN;
00000000  2  (***************************************************************************
00000000  2  THIS PROCEDURE FOLLOWS A VARIABLE LINKED LIST (POINTED TO BY P) LOOKING
00000000  2  FOR A VARIABLE WHOSE ADDRESS RANGE IS WITHIN THE GIVEN ADDRESS.  IT
00000000  2  RETURNS TRUE IF THE VARIABLE IS FOUND AND P IS SET TO THE START OF THE
00000000  2  VARIABLE RECORD.  IT RETURNS FALSE IF THE VARIABLE IS NOT FOUND ON
00000000  2  THE LIST AND THE CONTENTS OF P IS DISTROYED.
00000000  2  IF STATIC THEN THE LIST IS CONCIDERED SORTED AND THE ADDRESSES MUST BE
00000000  2  CONVERTED TO PHYSICAL ELSE IT IS STATIC AND THE ADDRESSES ARE OFFSETS
00000000  2  A REQUIREMENT IS THAT THE BASE POINTER CAN'T BE INBEDDED WITHIN ANY VARIABLE.
00000000  2  ***************************************************************************)
00000000  2  LABEL
```

```
00000000  2    10;
00000001  2
00000001  2  VAR
00000001  2    ERROR:S_INT;
00000004  2    OFFSET:S_INT;
00000006  2    FOUND:BOOLEAN;
00000007  2    S_TYPE:S_INT;
0000000A  2    SIZE,VALUE:AR2_INT;
00000004  2
00000004  2
00000004  2  BEGIN
00000004  2
00000004  2  OFFSET:=1;
0000000A  2  FOUND:=FALSE;
0000000E  2  WHILE (OFFSET <> 0 ) AND (NOT FOUND) DO
00000026  2    BEGIN  (* LOOKING FOR A SYMBOL *)
00000026  2    S_TYPE:=SHIFT(SHIFT(P^,8),-8);
00000036  2    IF S_TYPE = 15
0000003E  2       THEN
0000003E  2          VIRTUALINC(P,EXT_OFFSET)      (* EXTERNAL PROC *)
00000066  2       ELSE
00000066  2          BEGIN   (* VARIABLE *)
00000066  2          VIRTUALINC(P,VAR_ADDR_OFFSET);
0000008A  2          VALUE[0]:=P^;
00000094  2          VIRTUALINC(P,1);
000000B8  2          VALUE[1]:=P^;
000000C2  2          IF STATIC
000000CA  2             THEN P_ADDR(VALUE,VALUE);
000000DA  2          IF UNSIGNED_32(VALUE) <= UNSIGNED_32(ADDRESS)   (* VALUE <= ADDRESS *)
000000E8  2             THEN
000000E8  2                BEGIN  (* COULD BE A BRACKET *)
000000E8  2                 VIRTUALINC(P,3);
0000010C  2                 SIZE[0]:=P^;
00000116  2                 VIRTUALINC(P,1);
0000013A  2                 SIZE[1]:=P^;
00000144  2                 VALUE:=AR2_INT(INTEGER(VALUE)+INTEGER(SIZE)-1);
00000158  2                 IF UNSIGNED_32(ADDRESS) <= UNSIGNED_32(VALUE)  (* ADDRESS < VALUE *)
00000166  2                   THEN
00000166  2                      BEGIN  (* FOUND THE VARIABLE *)
00000166  2                      VIRTUALINC(P,-(VAR_ADDR_OFFSET+5)); (* BACK TO START OF RECORD *)
0000018A  2                      FOUND:=TRUE;
00000190  2                      END   (* FOUND THE VARIABLE *)
00000194  2                   ELSE
00000194  2                      VIRTUALINC(P,-2);   (* BACK TO THE OFFSET *)
000001B8  2                END   (* COUND BE A BRACKET *)
000001BC  2             ELSE
000001BC  2                IF STATIC
000001C4  2                   THEN
000001C4  2                      OFFSET:=0
000001CC  2                   ELSE
000001CC  2                      VIRTUALINC(P,2);
000001F0  2          END;  (* VARIABLE *)
000001F0  2    IF (NOT FOUND) AND (OFFSET <> 0)
00000208  2       THEN
00000208  2          BEGIN  (* KEEP LOOKING *)
00000208  2          OFFSET:=P^;
00000212  2          VIRTUALINC(P,OFFSET),
00000236  2          END;   (* KEEP LOOKING *)
00000236  2    END;  (* LOOKING FOR A SYMBOL *)
0000023A  2
0000023A  2  10:
0000023A  2
0000023A  2  CHECK_VAR_LIST:=FOUND;
00000240  2
00000240  2  END;   (* CHECK_VAR_LIST *)
00000000  1
00000000  1
00000000  1  PROCEDURE SUB_STATIC(PROGNO:S_INT; VAR SUBNO,NEXT_SUB:S_INT; VAR ADDRESS:AR2_INT;
00000000  2                      VAR PROCP:GENERIC_PTR; VAR ERROR:S_INT);
00000000  2  (*****************************************************************************
00000000  2  THIS PROCEDURE CHECKS THE GIVEN SUBNO TO SEE IF THE ADDRESS IS WITHIN
00000000  2  THE PROCEDURE'S RANGE FOR STATIC VARIABLES.  IF IT IS THEN A POINTER
00000000  2  TO THE PROCEDURE DATA IS RETURNED  IF IT IS NOT THEN THE PARENTS OF THE
00000000  2  PROCEDURE ARE CHECKED TO SEE IF IT WAS A SCOPED STATIC VARIABLE. IF IT
00000000  2  WAS THEN A POINTER TO THE PARENTS PROCEDURE IS RETURNED.  NEXT_SUB
```

```
00000000  2  IS THE SUBROUTINE NUMBER OF THE NEXT PROCEDURE TO BE SEARCHED FOLLOWING
00000000  2  THE SCOPING RULES.
00000000  2  ************************************************************************)
00000000  2
00000000  2  VAR
00000000  2    P:NODE_PTR,
00000004  2    FOUND:BOOLEAN;
0000024E  2
0000024E  2  BEGIN
0000024E  2
0000024E  2  ERROR:=0;
00000254  2  P:=SUB_INDEX(PROGNO,SUBNO,NEXT_SUB);
0000026E  2  FOUND:=FALSE;
00000272  2  WHILE (P <> NIL) AND (NOT FOUND) DO
0000028A  2    WITH P^ DO
00000290  2    BEGIN   (* FOUND A SUBNO *)
00000290  2    IF UNSIGNED_32(ADDRESS) >= UNSIGNED_32(MIN) (* ADDRESS >= MIN *)
000002A2  2       THEN
000002B2  2          IF UNSIGNED_32(ADDRESS) <= UNSIGNED_32(MAX)   (* ADDRESS <= MAX *)
000002D0  2             THEN
000002D0  2                BEGIN  (* FOUND IT *)
000002D0  2                FOUND:=TRUE;
000002D6  2                PROC_INFO(PROGNO,SUBNO,PROCP,ERROR);
000002D6  2                END;    (* FOUND IT *)
000002D6  2    IF PARENT_OFF <> 0
000002E2  2       THEN
000002E2  2          BEGIN  (* THIS PROCEDURE IS A PARENT *)
000002E2  2          P:=NODE_PTR(INTEGER(P)+P^.PARENT_OFF*2+4);
000002FA  2          NEXT_SUB:=SHIFT(P^.SUBNO_SIZE,-8);
00000308  2          END     (* THIS PROCEDURE IS A PARENT *)
0000030C  2       ELSE
0000030C  2          BEGIN  (* END OF THE LINE *)
0000030C  2          P:=NIL;
00000310  2          END;    (* END OF THE LINE *)
00000310  2    IF NOT FOUND
00000318  2       THEN SUBNO:=NEXT_SUB;
00000322  2    END;  (* FOUND A SUBNO *)
00000326  2
00000326  2  IF NOT FOUND
0000032E  2    THEN ERROR:=NOT_FOUND;
00000336  2
00000336  2  END;    (* SUB_STATIC *)
00000000  1
00000000  1
00000000  1
00000000  1  $GLOBPROC+$
00000000  1  PROCEDURE STATIC_VAR(PROGNO:S_INT; VAR SUBNO:S_INT; ABS_FILE:NAMEPTR; ABS_DISC:S_INT; VAR ADDRESS:AR2_INT;
00000000  2                        DB_PTR:INTEGER; VAR COUNT,ERROR:S_INT);
00000000  2  (************************************************************************
00000000  2  THIS PROCEDURE FETCHES THE STATIC VARIABLE RECORD AND PUTS IT IN THE
00000000  2  AREA POINTED TO BY DB_PTR. IT WILL ONLY USE COUNT WORDS OF DATA. IF
00000000  2  THE VARIABLE DOESN'T FIT IT WILL RETURN AND ERROR ELSE IT WILL RETURN
00000000  2  THE NUMBER OF WORDS USED BY THE VARIABLE IN COUNT.
00000000  2  THE VARIABLE FETCHED IS THE ONE SUCH THAT ADDRESS IS WITHIN ITS ADDRESS
00000000  2  RANGE.
00000000  2  SUBNO ON INPUT IS THE SUBROUTINE BEING TRACED. ON OUTPUT IT IS THE
00000000  2  SUBNO OF THE VARIABLE FOUND
00000000  2  ************************************************************************)
00000000  2  LABEL
00000000  2    10;
00000000  2
00000000  2  VAR
00000000  2    P,REL_ADDR:POINTER;
00000008  2    SYMTYPE:SYMSET;
00000009  2    LOAD:LOAD_REC;
00000016  2    SYM_FOUND:BOOLEAN;
00000017  2    NEXT_SUB:S_INT;
0000033E  2
0000033E  2
0000033E  2  BEGIN
0000033E  2
0000033E  2  SYM_FOUND:=FALSE;
00000342  2  PROG_LOAD(PROGNO,LOAD,ERROR);
```

```
0000035A  2  IF ERROR = 0 THEN
00000364  2    BEGIN  (* FOUND THE PROGNO *)
00000364  2    IF UNSIGNED_32(LOAD.MIN) <= UNSIGNED_32(ADDRESS)  (* MIN <= ADDRESS *)
00000372  2       THEN
00000372  2       IF UNSIGNED_32(ADDRESS) <= UNSIGNED_32(LOAD.MAX)  (* ADDRESS <= MAX *)
00000380  2            THEN
00000380  2               BEGIN  (* ADDRESS IS WITHIN LEVEL 1 VARS RANGE *)
00000380  2               LEVEL1VAR(PROGNO,P,ERROR);
00000398  2               REL_ADDR:=P;
0000039E  2               IF (ERROR = 0)
000003A8  2                  THEN
000003A8  2                     IF CHECK_VAR_LIST(ADDRESS,P,TRUE)
000003C6  2                        THEN
000003C6  2                           BEGIN  (* LEVEL1 VARIABLE *)
000003C6  2                           GET_SYM(DB_PTR,P,FALSE,SYMTYPE,COUNT,ERROR),
000003EA  2                           SUBNO:=0;    (* PROGRAM LEVEL VARIABLE *)
000003F0  2                           SYM_FOUND:=TRUE;
000003F6  2                           END;   (* LEVEL1 VARIABLE *)
000003F6  2               RELEASE_SYM_SPACE(REL_ADDR);
00000400  2               END;   (* ADDRESS IS WITHIN LEVEL 1 VARS RANGE *)
00000400  2    WHILE (NOT SYM_FOUND) AND (ERROR = 0) DO
0000041A  2       BEGIN  (* CHECK FOR LOCAL STATICS *)
0000041A  2       SUB_STATIC(PROGNO,SUBNO,NEXT_SUB,ADDRESS,GENERIC_PTR(P),ERROR);
00000442  2       REL_ADDR:=P;
00000448  2       IF ERROR = 0
00000452  2          THEN
00000452  2             BEGIN  (* FOUND A PROCEDURE WITH A CORRECT ADDRESS RANGE *)
00000452  2             VIRTUALINC(P,VAR_OFFSET);
00000478  2             IF P^ = 0
00000482  2                THEN
00000482  2                   BEGIN  (* THIS PROCEDURE HAS NO VARIABLES *)
00000482  2                   SUBNO:=NEXT_SUB;
0000048A  2                   END    (* THIS PROCEDURE HAS NO VARIABLES *)
0000049E  2                ELSE
0000049E  2                   BEGIN   (* CHECK PROCS VARS *)
0000049E  2                   VIRTUALINC(P,P^);
000004B6  2                   IF CHECK_VAR_LIST(ADDRESS,P,TRUE)
000004D4  2                      THEN
000004D4  2                         BEGIN  (* FOUND THE VARIABLE *)
000004D4  2                         GET_SYM(DB_PTR,P,FALSE,SYMTYPE,COUNT,ERROR);
000004F8  2                         SYM_FOUND:=TRUE;
000004FE  2                         END    (* FOUND THE VARIABLE *)
00000502  2                      ELSE
00000502  2                         BEGIN   (* KEEP LOOKING *)
00000502  2                         SUBNO:=NEXT_SUB;
0000050A  2                         END;     (* KEEP LOOKING *)
0000050A  2                   END;   (* CHECK PROCS VARS *)
0000050A  2             RELEASE_SYM_SPACE(REL_ADDR);
00000514  2             END;  (* FOUND A PROCEDURE WITH A CORRECT ADDRESS RANGE *)
00000514  2       END;  (* CHECK FOR LOCAL STATICS *)
00000518  2    END;  (* FOUND THE PROGNO *)
00000518  2
00000518  2  IF NOT SYM_FOUND
00000520  2    THEN ERROR:=NOT_FOUND;
00000528  2
00000528  2  10:
00000528  2
00000528  2  END;    (* STATIC_VAR *)
00000000  1
00000000  1
00000000  1  PROCEDURE CHECK_VAR(P:POINTER; OFFSET:S_INT; DB_PTR:INTEGER; VAR COUNT,ERROR:S_INT;
00000000  2                     VAR FOUND:BOOLEAN);
00000000  2  (***************************************************************************
00000000  2  THIS PROCEDURE CHECKS A VARIABLE LIST FOR AN OFFSET AND GETS THE DATABASE
00000000  2  INFORMATION IF THE VARIABLE IS FOUND
00000000  2  THE CONTENTS OF THE SYMBOL BUFFER POINTED TO BY P IS DISTROYED
00000000  2  ***************************************************************************)
00000000  2  LABEL
00000000  2    10;
00000000  2
00000000  2  VAR
00000000  2    OFF_VAL:AR2_INT;
00000004  2    SYMTYPE:SYMSET;
00000530  2
```

```
00000530  2  BEGIN
00000530  2
00000530  2  VIRTUALINC(P,P^);
00000558  2  OFF_VAL[1]:=OFFSET;
0000055E  2  IF OFFSET < 0
00000566  2     THEN OFF_VAL[0]:=0FFFFH
00000570  2     ELSE OFF_VAL[0]:=0;
00000574  2  IF CHECK_VAR_LIST(OFF_VAL,P,FALSE)
0000058E  2     THEN
0000058E  2        BEGIN  (* FOUND THE VARIABLE *)
0000058E  2        GET_SYM(DB_PTR,P,FALSE,SYMTYPE,COUNT,ERROR);
000005B2  2        FOUND:=TRUE;
000005BA  2        END;   (* FOUND THE VARIABLE *)
000005BA  2
000005BA  2  10:
000005BA  2
000005BA  2  END;  (* CHECK_VAR *)
00000000  1
00000000  1  PROCEDURE DYNA_VAR(PROGNO,SUBNO,OFFSET:S_INT; DB_PTR:INTEGER; UTYPE:U_TYPES;
00000000  2                        VAR COUNT,ERROR:S_INT);
00000000  2  (**************************************************************************
00000000  2  THIS PROCEDURE RETURNS THE DATABASE INFORMATION OF A VARIABLE OR
00000000  2  PARAMETER WHOSE PROCEDURE AND STACK OFFSET IS KNOWN.  (IE IT WILL BE
00000000  2  ASSUMED THAT THE VARIABLE OR PARAMETER IS LOCATED ON THE STACK)
00000000  2
00000000  2  ON INPUT: DB_PTR IS SET TO AN AREA OF SIZE COUNT.
00000000  2
00000000  2  ON OUTPUT: THE DATABASE INFORMATION IS READ INTO THE AREA POINTED TO
00000000  2             BY DB_PTR AND COUNT IS SET TO AMOUNT OF WORDS USED
00000000  2  ***************************************************************************)
00000000  2  LABEL
00000000  2    10;
00000000  2
00000000  2  VAR
00000000  2    FOUND:BOOLEAN;
00000001  2    P:POINTER;
000005C2  2
000005C2  2  BEGIN
000005C2  2
000005C2  2  FOUND:=FALSE;
000005C6  2  PROC_INFO(PROGNO,SUBNO,GENERIC_PTR(P),ERROR);
000005E2  2  IF ERROR = 0
000005EC  2    THEN
000005EC  2       BEGIN  (* FOUND THE PROCEDURE *)
000005EC  2       IF UTYPE = VAR_TYPES
000005F8  2          THEN
000005F8  2             BEGIN (* LOOKING FOR A VARIABLE *)
000005F8  2             VIRTUALINC(P,VAR_OFFSET);
0000061E  2             IF P^ <> 0
00000628  2                THEN CHECK_VAR(P,OFFSET,DB_PTR,COUNT,ERROR,FOUND);
0000064E  2             END   (* LOOKING FOR A VARIABLE *)
00000652  2          ELSE
00000652  2             BEGIN  (* LOOKING FOR A PARAMETER *)
00000652  2             VIRTUALINC(P,PARM_OFFSET);
00000678  2             IF P^ <> 0
00000682  2                THEN CHECK_VAR(P,OFFSET,DB_PTR,COUNT,ERROR,FOUND);
000006A8  2             END;  (* LOOKING FOR A PARAMETER *)
000006A8  2       END;  (* FOUND THE PROCEDURE *)
000006A8  2
000006A8  2  IF NOT FOUND
000006B0  2     THEN ERROR:=NOT_FOUND;
000006B8  2
000006B8  2  10:
000006B8  2
000006B8  2  RELEASE_SUBNO(PROGNO,SUBNO);
000006C6  2
000006C6  2
000006C6  2  END;   (* DYNA_VAR *)
00000000  1
00000000  1
00000000  1
00000000  1  PROCEDURE PARM_MIN_MAX(P:POINTER; VAR MIN_OFFSET,MAX_OFFSET,ERROR:S_INT);
00000000  2  (**************************************************************************
00000000  2  THIS PROCEDURE GETS THE MIN AND MAX OFFSETS FOR A GIVEN CHAIN OF PARMETERS
```

```
00000000  2  GIVEN THE POINTER TO THE START OF THE CHAIN (P).
00000000  2  IT DISTROYS THE CONTENTS OF THE SYMBOL BUFFER SO PROC_INFO MUST BE
00000000  2  CALLED AGAIN TO RESET TO THE START OF THE PROCEDURE RECORD
00000000  2  ******************************************************************************)
00000000  2  LABEL
00000000  2   10;
00000000  2
00000000  2
00000000  2  VAR
00000000  2    END_OF_CHAIN:BOOLEAN;
00000001  2    OFFSET:S_INT;
00000004  2    FIRST_TIME:BOOLEAN;
000006CE  2
000006CE  2  BEGIN
000006CE  2
000006CE  2  ERROR:=0;
000006D4  2  END_OF_CHAIN:=FALSE;
000006D8  2  FIRST_TIME:=TRUE;
000006DE  2  WHILE NOT END_OF_CHAIN  DO
000006E6  2    BEGIN  (* GO TO END OF CHAIN *)
000006E6  2    VIRTUALINC(P,VAR_ADDR_OFFSET+1);
0000070C  2    OFFSET:=P^;
00000714  2    IF FIRST_TIME
0000071C  2       THEN
0000071C  2          BEGIN   (* INITIALIZE MIN_OFFSET AND MAX_OFFSET *)
0000071C  2          FIRST_TIME:=FALSE;
00000720  2          MIN_OFFSET:=OFFSET+1;
0000072C  2          MAX_OFFSET:=OFFSET-1;
00000738  2          END;    (* INITIALIZE MIN_OFFSET AND MAX_OFFSET *)
00000738  2    IF OFFSET < MIN_OFFSET
00000746  2       THEN
00000746  2          BEGIN   (* A LOWER PARM *)
00000746  2          MIN_OFFSET:=OFFSET;
0000074C  2          END;    (* A LOWER PARM *)
0000074C  2    VIRTUALINC(P,4);    (* TO LSW OF SIZE *)
00000772  2    OFFSET:=OFFSET+P^-1;
00000782  2    IF OFFSET > MAX_OFFSET
0000078C  2       THEN
0000078C  2          BEGIN  (* A HIGHER PARM *)
0000078C  2          MAX_OFFSET:=OFFSET;
00000792  2          END;    (* A HIGHER PARM *)
00000792  2    VIRTUALINC(P,-2);
000007B8  2    IF P^ = 0
000007C2  2      THEN END_OF_CHAIN:=TRUE
000007CC  2      ELSE VIRTUALINC(P,P^);
000007F4  2    END;   (* GO TO END OF CHAIN *)
000007F8  2
000007F8  2  10:
000007F8  2
000007F8  2  END;  (* PARM_MIN_MAX *)
00000000  1
00000000  1
00000000  1
00000000  1
00000000  1  PROCEDURE VAR_MIN_MAX(P:POINTER; VAR MIN_OFFSET,MAX_OFFSET,ERROR:S_INT);
00000000  2  (****************************************************************************
00000000  2  THIS PROCEDURE GETS THE MIN AND MAX OFFSETS FOR A GIVEN CHAIN OF VARIABLES
00000000  2  GIVEN THE POINTER TO THE START OF THE CHAIN (P).
00000000  2  IT DISTROYS THE CONTENTS OF THE SYMBOL BUFFER SO PROC_INFO MUST BE
00000000  2  CALLED AGAIN TO RESET TO THE START OF THE PROCEDURE RECORD
00000000  2  ******************************************************************************)
00000000  2  LABEL
00000000  2    10;
00000000  2
00000000  2
00000000  2  VAR
00000000  2    END_OF_CHAIN:BOOLEAN;
00000001  2    OFFSET:S_INT;
00000004  2    FIRST_TIME:BOOLEAN;
00000800  2
00000800  2  BEGIN
00000800  2
00000800  2  ERROR:=0;
00000806  2  END_OF_CHAIN:=FALSE;
0000080A  2  FIRST_TIME:=TRUE;
```

```
00000810  2  MAX_OFFSET:=0;  (* INCASE NO DYNAMIC VARIABLES *)
00000816  2  WHILE NOT END_OF_CHAIN  DO
0000081E  2    BEGIN  (* GO TO END OF CHAIN *)
0000081E  2    IF SHIFT(SHIFT(P^,8),-8) = VAR_TYPE
00000830  2       THEN
00000830  2         BEGIN   (* A VARIABLE *)
00000830  2         VIRTUALINC(P,1);
00000856  2         IF SHIFT(SHIFT(P^,12),-15) = 1
00000870  2            THEN
00000870  2               BEGIN  (* DYNAMICLY ACTIVATED VAR *)
00000870  2               VIRTUALINC(P,3);
00000896  2               OFFSET:=P^;
0000089E  2               IF FIRST_TIME
000008A6  2                  THEN
000008A6  2                     BEGIN   (* INITIALIZE MIN_OFFSET AND MAX_OFFSET *)
000008A6  2                     FIRST_TIME:=FALSE;
000008AA  2                     MIN_OFFSET:=OFFSET+1;
000008B6  2                     MAX_OFFSET:=OFFSET-1;
000008C2  2                     END;    (* INITIALIZE MIN_OFFSET AND MAX_OFFSET *)
000008C2  2               IF OFFSET < MIN_OFFSET
000008D0  2                  THEN
000008D0  2                     BEGIN   (* A LOWER VAR *)
000008D0  2                     MIN_OFFSET:=OFFSET;
000008D6  2                     END;    (* A LOWER VAR *)
000008D6  2               VIRTUALINC(P,4);  (* TO LSW OF SIZE *)
000008FC  2               OFFSET:=OFFSET+P^-1;
0000090C  2               IF OFFSET > MAX_OFFSET
00000916  2                  THEN
00000916  2                     BEGIN  (* A HIGHER VAR *)
00000916  2                     MAX_OFFSET:=OFFSET;
0000091C  2                     END;    (* A HIGHER VAR *)
0000091C  2               VIRTUALINC(P,-2);
00000942  2               END    (* DYNAMICLY ACTIVATED VAR *)
00000946  2            ELSE
00000946  2               VIRTUALINC(P,5);
0000095C  2         IF P^ = 0
00000976  2           THEN END_OF_CHAIN:=TRUE
00000990  2           ELSE VIRTUALINC(P,P^);
000009A8  2         END   (* A VARIABLE *)
000009AC  2       ELSE
000009AC  2         END_OF_CHAIN:=TRUE;
000009B2  2    END;   (* GO TO END OF CHAIN *)
000009B6  2
000009B6  2  10:
000009B6  2
000009B6  2  END;  (* VAR_MIN_MAX *)
00000000  1
00000000  1
00000000  1
00000000  1  PROCEDURE PROC_STACK(PROGNO,SUBNO:S_INT; VAR RECUR_FLAG:BOOLEAN;
00000000  2                        VAR PARM_MIN,PARM_MAX,VAR_MIN,VAR_MAX,ERROR:S_INT);
00000000  2  (***************************************************************************
00000000  2  THIS PROCEDURE RETURNS THE STACK INFORMATION FOR A PROCEDURE.  IT SETS
00000000  2  RECUR_FLAG BASED UPON IF THE PROCEDURE IS RECUSIVE AND RETURNS THE
00000000  2  STACK OFFSET RANGES FOR THE PARAMETERS AND THE LOCAL VARIABLES IF ANY.
00000000  2  IF NO PARMS OR LOCAL VARIABLES THEN THE CORRESPONDING MAX IS SET TO 0.
00000000  2  ***************************************************************************)
00000000  2  LABEL
00000000  2    10;
00000000  2
00000000  2
00000000  2  VAR
00000000  2    P:POINTER;
00000004  2    Q:GENERIC_PTR;
00000008  2    FLAGS:SOC;
000009BE  2
000009BE  2  BEGIN
000009BE  2
000009BE  2  PROC_INFO(PROGNO,SUBNO,Q,ERROR);
000009DA  2  IF ERROR = 0
000009E4  2    THEN
000009E4  2       BEGIN (* FOUND THE PROCEDURE *)
000009E4  2       FLAGS:=Q.SPTR^.FLAGS;
000009EE  2       IF BIT0 IN FLAGS
```

```
000009F8  2           THEN RECUR_FLAG:=FALSE
00000A02  2           ELSE RECUR_FLAG:=TRUE;
00000A0A  2        IF Q.SPTR^.PARM_OFFSET <> 0
00000A16  2           THEN
00000A16  2              BEGIN  (* PROCEDURE HAS PARAMETERS *)
00000A16  2              P:=POINTER(Q);
00000A1C  2              VIRTUALINC(P,PARM_OFFSET);
00000A42  2              VIRTUALINC(P,P^);
00000A6A  2              PARM_MIN_MAX(P,PARM_MIN,PARM_MAX,ERROR);
00000A8A  2              IF ERROR <> 0 THEN GOTO 10;
00000A98  2              RELEASE_SUBNO(PROGNO,SUBNO);
00000AA6  2              PROC_INFO(PROGNO,SUBNO,Q,ERROR);
00000AC2  2              IF ERROR <> 0 THEN GOTO 10;
00000AD0  2              END    (* PROCEDURE HAS PARAMETERS *)
00000AD4  2           ELSE
00000AD4  2              PARM_MAX:=0;
00000ADA  2        IF RECUR_FLAG
00000AE4  2           THEN
00000AE4  2              BEGIN  (* PROCEDURE IS RECURSIVE SO GET VAR MIN MAX'S *)
00000AE4  2              IF Q.SPTR^.VAR_OFFSET <> 0
00000AF0  2                 THEN
00000AF0  2                    BEGIN (* PROCEDURE HAS VARS *)
00000AF0  2                    P:=POINTER(Q);
00000AF6  2                    VIRTUALINC(P,VAR_OFFSET);
00000B1C  2                    VIRTUALINC(P,P^);
00000B44  2                    VAR_MIN_MAX(P,VAR_MIN,VAR_MAX,ERROR);
00000B64  2                    IF ERROR <> 0 THEN GOTO 10;
00000B72  2                    END   (* PROCEDURE HAS VARS *)
00000B76  2                 ELSE
00000B76  2                    VAR_MAX:=0;
00000B7C  2              END,  (* PROCEDURE IS RECURSIVE SO GET VAR MIN MAX'S *)
00000B7C  2        END,  (* FOUND THE PROCEDURE *)
00000B7C  2
00000B7C  2  10:
00000B7C  2
00000B7C  2  RELEASE_SUBNO(PROGNO,SUBNO);
00000B8A  2
00000B8A  2  END;   (* PROC_STACK *)
00000000  1
00000000  1  .

****WARNING ?? - Symbol: LABEL_10, is duplicated in the asmb_syn file.
****WARNING ?? - Symbol: LABEL_10, is duplicated in the asmb_syn file.
****WARNING ?? - Symbol: LABEL_10, is duplicated in the asmb_syn file.
****WARNING ?? - Symbol: LABEL_10, is duplicated in the asmb_syn file.
****WARNING ?? - Symbol: LABEL_10, is duplicated in the asmb_syn file.
****WARNING ?? - Symbol: LABEL_10, is duplicated in the asmb_syn file.

End of compilation, number of errors=    0
00000000  1  "68000"  PREPROCESS
00000000  1  $EXTENSIONS ON$
00000000  1  PROGRAM WHICH;
00000000  1
00000000  1  CONST
00000000  1    LESS = 0;
00000000  1    EQUAL = 1;
00000000  1    GREATER_THAN = 2;
00000000  1    L_SIZE = 4;
00000000  1    RECSIZE = 128;
00000000  1    LINK_SYM = 13;
00000000  1
00000000  1  #INCLUDE ERROR:INCLUD
00000000  1
00000000  1  #DEFINE IO_ERROR(ERROR,DCB)   BEGIN               \
00000000  1                                IOERROR(ERROR,DCB);\
00000000  1                                GOTO 10;            \
00000000  1                                END
00000000  1  TYPE
00000000  1    S_INT = SIGNED_16;
00000000  1    DCBTYPE = S_INT;
00000000  1    BUFFTYPE = ARRAY [0..RECSIZE] OF S_INT;
00000000  1    NAMEPTR = ^NAME;
00000000  1    NAME = ARRAY[0..7] OF S_INT;
```

```
00000000 1    AR2_INT = ARRAY[0..1] OF S_INT;
00000000 1
00000000 1  VAR
00000000 1
00000000 1    RBUF:BUFFTYPE;
00000102 1
00000102 1  $GLOBVAR+$
00000102 1    L_DISC:S_INT;
00000104 1    RANGE_START,NAME_START:S_INT;
00000108 1  $GLOBVAR-$
00000108 1
00000108 1  $EXTVAR+$
00000108 1    L_DCB:DCBTYPE;
00000108 1    L_FILE:NAME;
00000108 1  $EXTVAR-$
00000000 1
00000000 1  PROCEDURE P_CLOSE(VAR DCB:DCBTYPE; VAR ERROR:S_INT);EXTERNAL;
00000000 1  PROCEDURE P_OPEN(VAR FILENAME:NAME; FTYPE,DISC:S_INT; VAR DCB:DCBTYPE;
00000000 2                   SIZE:S_INT; VAR ERROR:S_INT);EXTERNAL;
00000000 1  PROCEDURE P_POSITION(VAR DCB:DCBTYPE; RECNO:S_INT; VAR ERROR:S_INT);EXTERNAL;
00000000 1  PROCEDURE P_READ(VAR DCB:DCBTYPE; VAR RBUF:BUFFTYPE; RECSIZE:S_INT;
00000000 2                   VAR ERROR:S_INT);EXTERNAL;
00000000 1  PROCEDURE IOERROR(VAR ERROR:S_INT; VAR DCB:DCBTYPE);EXTERNAL;
00000108 1  $CALL_ABS_LONG$
00000000 1  PROCEDURE P_ADDR(INVAL:AR2_INT; VAR OUTVAL:AR2_INT);EXTERNAL;
00000108 1  $CALL_PC_SHORT$
00000000 1  FUNCTION COMPAREFILE(F1,F2:NAMEPTR):BOOLEAN;EXTERNAL;
00000000 1  PROCEDURE OUTIT(LETTER:CHAR; VALUE:S_INT; BASE:CHAR);EXTERNAL;
00000000 1
00000000 1
00000000 1  PROCEDURE GET_NAME(VAR DCB:DCBTYPE; VAR RBUF:BUFFTYPE; RECSIZE:S_INT;
00000000 2                     NAMENO,NAME_START:S_INT; FNAME:NAMEPTR; VAR DISC,ERROR:S_INT);
00000000 2  (*************************************************************************
00000000 2  THIS PROCEDURE FINDS THE NAMENO IN THE PROGRAM NAME LIST AND UPDATES FNAME
00000000 2  CONTENTS AND DISC ACCORDINGLY
00000000 2  *************************************************************************)
00000000 2  LABEL
00000000 2    10;
00000000 2
00000000 2  VAR
00000000 2    FOUND:BOOLEAN;
00000001 2    CUR_NO:S_INT;
00000004 2    SIZE:S_INT;
00000006 2    I,K:S_INT;
00000004 2
00000004 2
00000004 2  BEGIN
00000004 2
00000004 2  P_POSITION(DCB,NAME_START,ERROR);
0000001E 2  IF ERROR <> 0 THEN IO_ERROR(ERROR,DCB);
0000003E 2  FOUND:=FALSE;
00000042 2  CUR_NO:=0;
00000046 2  WHILE (ERROR = 0) AND (NOT FOUND) DO
00000060 2    BEGIN  (* LOOK AT ADDRESSES *)
00000060 2    P_READ(DCB,RBUF,RECSIZE,ERROR);
00000080 2    IF ERROR > 1 THEN IO_ERROR(ERROR,DCB);
000000A4 2    SIZE:=SHIFT(SHIFT(RBUF[0],8),-8);
000000B2 2    I:=2;
000000B8 2    WHILE (I < SIZE) AND (NOT FOUND) AND (ERROR = 0) DO
000000E2 2       BEGIN  (* SEARCH THE RECORD *)
000000E2 2       IF CUR_NO = NAMENO
000000EE 2          THEN
000000EE 2             BEGIN (* FOUND THE CORRECT NAME *)
000000EE 2             FOUND:=TRUE;
000000F4 2             FOR K:=0 TO 7 DO
000000F8 2                FNAME^[K]:=RBUF[I+K];
00000126 2             DISC:=SHIFT(SHIFT(RBUF[I],5),-13);
00000142 2             END  (* FOUND THE CORRECT NAME *)
00000146 2          ELSE
00000146 2             CUR_NO:=CUR_NO+1;
0000014A 2       I:=I+14;
00000150 2       END;    (* SEARCH THE RECORD *)
00000154 2    END;      (* LOOK AT ADDRESSES *)
00000158 2
```

```
00000158  2  10:
00000158  2
00000158  2  END;  (* GET_NAME *)
00000000  1
00000000  1
00000000  1
00000000  1  FUNCTION COMPARE_BOUNDS(VAR ADDRESS:AR2_INT; VAR RBUF:BUFFTYPE; INDEX:S_INT;
00000000  2                            VAR START_ADDR,END_ADDR:AR2_INT):S_INT;
00000002  2  (*******************************************************************************
00000002  2  THIS FUNCTION RETURNS AN S_INT BASED UPON HOW THE ADDRESS FALLS WITHIN
00000002  2  THE BOUNDS
00000002  2    CONDITION                              RETURN VALUE
00000002  2    UPPER BOUND LESS THAN ADDRESS          0 - LESS
00000002  2    ADDRESS WITHIN BOUNDS                  1 - EQUAL
00000002  2    LOWER BOUND GREATER THAN ADDRESS       2 - GREATER_THAN
00000002  2  *******************************************************************************)
00000002  2
00000002  2  VAR
00000002  2    BOUND:AR2_INT;
00000160  2
00000160  2  BEGIN
00000160  2
00000160  2  BOUND[1]:=RBUF[INDEX];
00000170  2  BOUND[0]:=RBUF[INDEX+1];
0000017E  2  P_ADDR(BOUND,BOUND);
0000018E  2  START_ADDR:=BOUND;
00000196  2  IF UNSIGNED_32(BOUND) <= UNSIGNED_32(ADDRESS)
000001A4  2    THEN
000001A4  2       BEGIN  (* BOUND <= ADDRESS *)
000001A4  2       BOUND[1]:=RBUF[INDEX+2];
000001B6  2       BOUND[0]:=RBUF[INDEX+3];
000001C4  2       P_ADDR(BOUND,BOUND);
000001D4  2       END_ADDR:=BOUND;
000001DC  2       IF UNSIGNED_32(ADDRESS) <= UNSIGNED_32(BOUND)
000001EA  2          THEN COMPARE_BOUNDS:=EQUAL   (* ADDRESS <= BOUND *)
000001F4  2          ELSE COMPARE_BOUNDS:=LESS;
000001F8  2       END  (* BOUND <= ADDRESS *)
000001FC  2    ELSE
000001FC  2       COMPARE_BOUNDS:=GREATER_THAN;
00000202  2
00000202  2  END;  (* COMPARE_BOUNDS *)
00000000  1
00000000  1
00000000  1
00000000  1  PROCEDURE ADV_FILE(VAR DCB:DCBTYPE; VAR RBUF:BUFFTYPE; RECSIZE,RECTYPE:S_INT;
00000000  2                     VAR COUNT,ERROR:S_INT);
00000000  2  (*******************************************************************************
00000000  2  THIS PROCEDURE ADVANCES A FILE UNTIL RECTYPE RECORD IS FOUND
00000000  2  IT RETURNS THE NUMBER OF RECORDS ADVANCED
00000000  2  *******************************************************************************)
00000000  2  LABEL
00000000  2    10;
00000210  2
00000210  2  BEGIN
00000210  2
00000210  2  ERROR:=0;
00000216  2  COUNT:=1;
0000021E  2  P_READ(DCB,RBUF,RECSIZE,ERROR);
0000023E  2  IF ERROR <> 0 THEN IO_ERROR(ERROR,DCB);
0000025E  2  WHILE (ERROR = 0) AND (RBUF[1] <> RECTYPE) DO
00000282  2    BEGIN   (* FIND RECTYPE RECORD *)
00000282  2    P_READ(DCB,RBUF,RECSIZE,ERROR);
000002A2  2    IF ERROR <> 0 THEN IO_ERROR(ERROR,L_DCB);
000002C0  2    COUNT:=COUNT+1;
000002CA  2    END;   (* FIND RECTYPE RECORD *)
000002CC  2
000002CC  2  10:
000002CC  2
000002CC  2  END;  (* ADV_FILE *)
00000000  1
00000000  1
00000000  1  $GLOBPROC+$
00000000  1
00000000  1
```

```
00000000 1 PROCEDURE OPEN_LINK_SYM(ABS_FILE:NAMEPTR; ABS_DISC:S_INT; VAR ERROR:S_INT);
00000000 2 (**********************************************************************
00000000 2 THIS PROCEDURE OPENS THE LINK SYMBOL FILE TO THE ABS_FILE NAME
00000000 2 AND INITIALIZES THE REQUIRED VARIABLES
00000000 2 **********************************************************************)
00000000 2 LABEL
00000000 2  10;
000002D4 2
000002D4 2
000002D4 2 BEGIN
000002D4 2
000002D4 2 IF L_FILE[0] <> 0
000002DC 2    THEN P_CLOSE(L_DCB,ERROR);
000002EC 2 P_OPEN(ABS_FILE^,LINK_SYM,ABS_DISC,L_DCB,L_SIZE,ERROR);
00000312 2 IF ERROR <> 0 THEN IO_ERROR(ERROR,L_DCB);
00000330 2 ADV_FILE(L_DCB,RBUF,RECSIZE,3,NAME_START,ERROR);
00000354 2 IF ERROR <> 0 THEN GOTO 10;
00000362 2 ADV_FILE(L_DCB,RBUF,RECSIZE,4,RANGE_START,ERROR);
00000386 2 IF ERROR <> 0 THEN GOTO 10;
00000394 2 RANGE_START:=RANGE_START+NAME_START;
0000039C 2 L_FILE:=ABS_FILE^;
000003AC 2 L_DISC:=ABS_DISC;
000003B2 2
000003B2 2 10:
000003B2 2
000003B2 2 END;   (* OPEN_LINK_SYM *)
00000000 1
00000000 1 PROCEDURE WHICH_FILE(ABS_FILE:NAMEPTR; ABS_DISC:S_INT; VAR ADDRESS,START_ADDR,END_ADDR:ARZ_INT;
00000000 2                       FNAME:NAMEPTR; VAR DISC,RELOC,ERROR:S_INT);
00000000 2 (**********************************************************************
00000000 2 THIS PROCEDURE TAKES A GIVEN ABSOLUTE FILE NAME AND DISC AND A GIVEN
00000000 2 PHYSICIAL ADDRESS AND RETURNS THE NAME AND DISC OF THE SOURCE FILE
00000000 2 THAT THE ADDRESS IS CONTAINED WITHIN.  IT SETS ERROR TO -3 IF
00000000 2 IF THE ADDRESS CAN'T BE FOUND.
00000000 2 IT IS ASSUMED THAT THE ADDRESS IS A PHYSICAL ADDRESS
00000000 2 IT ALSO RETURNS THE RELOCATION TYPE OF THE ADDRESS IN RELOC
00000000 2   0 = ABS RELOCATION
00000000 2   1 = PROGRAM RELOCATION
00000000 2   2 = DATA RELOCATION
00000000 2   3 = COMMON RELOCATION
00000000 2 **********************************************************************)
00000000 2 LABEL
00000000 2   10;
00000000 2
00000000 2 VAR
00000000 2   FOUND:BOOLEAN;
00000001 2   SIZE,I,K:S_INT;
00000008 2   COMP_VAL:S_INT;
000003BA 2
000003BA 2 BEGIN
000003BA 2
000003BA 2 IF (COMPAREFILE(ABS_FILE,ADDR(L_FILE))) AND (ABS_DISC = L_DISC)
000003DE 2    THEN
000003DE 2      BEGIN  (* FILE ALREADY OPENED *)
000003DE 2      P_POSITION(L_DCB,RANGE_START,ERROR);
000003F6 2      IF ERROR <> 0 THEN IO_ERROR(ERROR,L_DCB);
00000414 2      P_READ(L_DCB,RBUF,RECSIZE,ERROR);
00000430 2      IF ERROR <> 0 THEN IO_ERROR(ERROR,L_DCB);
0000044E 2      END  (* FILE ALREADY OPENED *)
00000452 2   ELSE
00000452 2      BEGIN (* OPEN NEW FILE *)
00000452 2      OPEN_LINK_SYM(ABS_FILE,ABS_DISC,ERROR);
0000046A 2      END;  (* OPEN NEW FILE *)
0000046A 2 FOUND:=FALSE;
0000046E 2 WHILE (ERROR = 0) AND (NOT FOUND) DO
00000488 2   BEGIN  (* LOOK AT ADDRESSES *)
00000488 2   SIZE:=SHIFT(SHIFT(RBUF[0],8),-8);
00000494 2   I:=2;
0000049A 2   WHILE (I < SIZE) AND (NOT FOUND) AND (ERROR = 0) DO
000004C4 2      BEGIN  (* SEARCH THE RECORD *)
000004C4 2      COMP_VAL:=COMPARE_BOUNDS(ADDRESS,RBUF,I,START_ADDR,END_ADDR);
000004EA 2      IF COMP_VAL = EQUAL
000004F6 2         THEN
000004F6 2           BEGIN (* FOUND THE FILE NO *)
```

```
00C004F6  2             RELOC:=SHIFT(SHIFT(RBUF[I+4],14),-14);
00000514  2             IF SHIFT(SHIFT(RBUF[I+5],6),-15) = 1
00000534  2               THEN
00000534  2                 GET_NAME(L_DCB,RBUF,RECSIZE,SHIFT(RBUF[I+4],-2),NAME_START,FNAME,DISC,ERROR)
00000572  2               ELSE
00000572  2                 BEGIN  (* USE RELOCATABLE NAME SINCE IT IS THE SAME *)
00000572  2                 I:=I+5;
00000576  2                 FOR K:=0 TO 7 DO
0000057A  2                   FNAME^[K]:=RBUF[I+K];
000005A8  2                 DISC:=SHIFT(SHIFT(RBUF[I+8],1),-13);
000005C6  2                 END;   (* USE RELOCATABLE NAME SINCE IT IS THE SAME *)
000005C6  2             FOUND:=TRUE;
000005CC  2             END;  (* FOUND THE FILE NO *)
000005CC  2         I:=I+14;
000005D2  2         END;   (* SEARCH THE RECORD *)
000005D6  2     IF (NOT FOUND) AND (ERROR = 0)
000005F0  2         THEN
000005F0  2           BEGIN (* READ NEXT RECORD *)
000005F0  2           P_READ(L_DCB,RBUF,RECSIZE,ERROR);
0000060C  2           IF ERROR > 1 THEN IO_ERROR(ERROR,L_DCB);
0000062E  2           END;
0000062E  2     END;       (* LOOK AT ADDRESSES *)
00000632  2
00000632  2  IF ERROR = 1
00000640  2     THEN ERROR := NOT_FOUND;
00000648  2
00000648  2
00000648  2  10:
00000648  2
00000648  2  END;  (* WHICH_FILE *)
00000000  1  .

****WARNING ?? - Symbol: LABEL_10, is duplicated in the asmb_sym file.
****WARNING ?? - Symbol: LABEL_10, is duplicated in the asmb_sym file.
****WARNING ?? - Symbol: LABEL_10, is duplicated in the asmb_sym file.

End of compilation, number of errors=    0

00000000  1  "68000"  PREPROCESS
00000000  1  $EXTENSIONS ON$
00000000  1  PROGRAM F_RANGE;
00000000  1
00000000  1  CONST
00000000  1    RECSIZE = 128;
00000000  1
00000000  1  #INCLUDE ERROR:INCLUD
00000000  1
00000000  1  #DEFINE IO_ERROR(ERROR,DCB)   BEGIN              \
00000000  1                                IOERROR(ERROR,DCB);\
00000000  1                                GOTO 10;           \
00000000  1                                END
00000000  1
00000000  1  TYPE
00000000  1    S_INT = SIGNED_16;
00000000  1    DCBTYPE = S_INT;
00000000  1    BUFFTYPE = ARRAY [0..RECSIZE] OF S_INT;
00000000  1    NAMEPTR = ^NAME;
00000000  1    NAME = ARRAY[0..7] OF S_INT;
00000000  1    AR2_INT = ARRAY[0..1] OF S_INT;
00000000  1
00000000  1  VAR
00000000  1
00000000  1  $EXTVAR+$
00000000  1    L_DISC:S_INT;
00000000  1    RANGE_START,NAME_START:S_INT;
00000000  1    L_DCB:DCBTYPE;
00000000  1    L_FILE:NAME;
00000000  1  $EXTVAR-$
00000000  1
00000000  1  PROCEDURE P_POSITION(VAR DCB:DCBTYPE; RECNO:S_INT; VAR ERROR:S_INT);EXTERNAL;
00000000  1  PROCEDURE P_READ(VAR DCB:DCBTYPE; VAR RBUF:BUFFTYPE; RECSIZE:S_INT;
00000000  2                VAR ERROR:S_INT);EXTERNAL;
00000000  1  PROCEDURE IOERROR(VAR ERROR:S_INT; VAR DCB:DCBTYPE);EXTERNAL;
00000000  1  PROCEDURE OPEN_LINK_SYM(ABS_FILE:NAMEPTR; ABS_DISC:S_INT; VAR ERROR:S_INT);EXTERNAL;
```

```
00000000  1
00000000  1
00000000  1  $CALL_PC_SHORTS
00000000  1  FUNCTION COMPAREFILE(F1,F2:NAMEPTR):BOOLEAN;EXTERNAL;
00000000  1  PROCEDURE OUTIT(LETTER:CHAR; VALUE:S_INT; BASE:CHAR);EXTERNAL;
00000000  1
00000000  1
00000000  1  PROCEDURE GET_RANGE(INDEX:S_INT; VAR START_ADDR,END_ADDR:AR2_INT; VAR ERROR:S_INT);
00000000  2  (*****************************************************************************
00000000  2  THIS PROCEDURE RETURNS THE RANGE OF ADDRESSES OF THE RELOCATABLE CORRESPONDING
00000000  2  TO THE SOURCE INDEX.  THE RANGE IS THE PROGRAM ADDRESS RANGE IN
00000000  2  LOGICAL FORMAT.
00000000  2  *********************************************************************************)
00000000  2  LABEL
00000000  2    10;
00000000  2
00000000  2  VAR
00000000  2    FOUND:BOOLEAN;
00000001  2    SIZE:S_INT;
00000004  2    I:S_INT;
00000006  2    RBUF:BUFFTYPE;
00000004  2
00000004  2
00000004  2  BEGIN
00000004  2
00000004  2  P_POSITION(L_DCB,RANGE_START,ERROR);
0000001C  2  IF ERROR <> 0 THEN IO_ERROR(ERROR,L_DCB);
0000003A  2  FOUND:=FALSE;
0000003E  2  INDEX:=SHIFT(INDEX,2)+1;    (* LOOKING FOR PROGRAM RELOCATION AND THE INDEX *)
0000004A  2  WHILE (ERROR = 0) AND (NOT FOUND) DO
00000064  2    BEGIN  (* LOOK FOR THE INDEX *)
00000064  2    P_READ(L_DCB,RBUF,RECSIZE,ERROR);
00000080  2    IF ERROR > 1 THEN IO_ERROR(ERROR,L_DCB);
000000A2  2    SIZE:=SHIFT(SHIFT(RBUF[0],8),-8);
000000AE  2    I:=2;
000000B4  2    WHILE (I < SIZE) AND (NOT FOUND) AND (ERROR = 0) DO
000000DE  2       BEGIN  (* SEARCH THE RECORD *)
000000DE  2       IF RBUF[I+4] = INDEX
000000F2  2          THEN
000000F2  2             BEGIN  (* FOUND IT *)
000000F2  2             FOUND:=TRUE;
000000F8  2             START_ADDR[1]:=RBUF[I];
00000108  2             START_ADDR[0]:=RBUF[I+1];
0000011C  2             END_ADDR[1]:=RBUF[I+2];
00000132  2             END_ADDR[0]:=RBUF[I+3];
00000146  2             END  (* FOUND IT *)
0000014A  2          ELSE
0000014A  2             I:=I+14;
00000150  2       END;   (* SEARCH THE RECORD *)
00000154  2    END;       (* LOOK FOR INDEX *)
00000158  2
00000158  2  IF NOT FOUND
00000160  2    THEN ERROR:=NOT_FOUND;
00000168  2
00000168  2  10:
00000168  2
00000168  2  END;  (* GET_RANGE *)
00000000  1
00000000  1
00000000  1  FUNCTION GET_SOURCE_INDEX(FNAME:NAMEPTR; DISC:S_INT; VAR ERROR:S_INT):S_INT;
00000000  2  (*****************************************************************************
00000000  2  THIS FUNCTION RETURNS THE SOURCE INDEX OF A SOURCE FILE IN THE LINK_SYM FILE.
00000000  2  THIS INDEX CAN THEN BE USED TO LOOKUP THE CORRESPONDING RELOCATABLE RANGES.
00000000  2  IF THE SOURCE FILE CANNOT BE FOUND THEN ERROR = NOT_FOUND IS RETURNED
00000000  2  *********************************************************************************)
00000000  2  LABEL
00000000  2    10;
00000002  2
00000002  2  VAR
00000002  2    FOUND:BOOLEAN;
00000003  2    CUR_NO:S_INT;
00000006  2    SIZE:S_INT;
00000008  2    I:S_INT;
```

```
0000000A  2    DISC_MATCH:BOOLEAN;
0000000B  2    RBUF:BUFFTYPE;
00000170  2
00000170  2
00000170  2  BEGIN
00000170  2
00000170  2  P_POSITION(L_DCB,NAME_START,ERROR);
00000189  2  IF ERROR <> 0 THEN IO_ERROR(ERROR,L_DCB);
000001A6  2  FOUND:=FALSE;
000001AA  2  CUR_NO:=0;
000001AE  2  WHILE (ERROR = 0) AND (NOT FOUND) DO
000001C2  2    BEGIN  (* LOOK FOR SOURCE FILE *)
000001C8  2    P_READ(L_DCB,RBUF,RECSIZE,ERROR);
000001E4  2    IF ERROR > 1 THEN IO_ERROR(ERROR,L_DCB);
00000206  2    SIZE:=SHIFT(SHIFT(RBUF[0],8),-8);
00000212  2    I:=2;
00000218  2    WHILE (I < SIZE) AND (NOT FOUND) AND (ERROR = 0) DO
00000242  2       BEGIN  (* SEARCH THE RECORD *)
00000242  2       IF DISC <> -1
0000024E  2          THEN
0000024E  2             BEGIN   (* CHECK DISCS *)
0000024E  2             IF DISC = SHIFT(SHIFT(RBUF[I],5),-13)
00000266  2                THEN
00000266  2                   DISC_MATCH:=TRUE
00000270  2                ELSE
00000270  2                   DISC_MATCH:=FALSE;
00000274  2             END     (* CHECK DISCS *)
00000278  2          ELSE
00000278  2             DISC_MATCH:=TRUE;
0000027E  2       IF DISC_MATCH
00000286  2          THEN FOUND:=COMPAREFILE(ADDR(RBUF[I]),FNAME);
00000294  2       IF NOT FOUND
000002AC  2          THEN
000002AC  2             BEGIN  (* INCREMENT TO NEXT ENTRY *)
000002AC  2             I:=I+14;
000002B2  2             CUR_NO:=CUR_NO+1;
000002B6  2             END;   (* INCREMENT TO NEXT ENTRY *)
000002B6  2       END;   (* SEARCH THE RECORD *)
000002BA  2    END;      (* LOOK FOR THE SOURCE FILE *)
000002BE  2
000002BE  2  IF FOUND
000002C6  2    THEN GET_SOURCE_INDEX:=CUR_NO
000002D0  2    ELSE ERROR:=NOT_FOUND;
000002D8  2
000002D8  2  10:
000002D8  2
000002D8  2  END;  (* GET_SOURCE_INDEX *)
00000000  1
00000000  1  $GLOBPROC+$
00000000  1
00000000  1  PROCEDURE FILE_RANGE(ABS_FILE:NAMEPTR; ABS_DISC:S_INT; FNAME:NAMEPTR; DISC:S_INT;
00000000  2                          VAR START_ADDR,END_ADDR:AR2_INT; VAR ERROR:S_INT);
00000000  2  (******************************************************************************
00000000  2  THIS PROCEDURE TAKES A GIVEN ABSOLUTE FILE NAME AND DISC AND A GIVEN
00000000  2  SOURCE FILE AND DISC AND RETURNS THE ADDRESS RANGE OF COORESPONDING RELOCATABLE
00000000  2  FILES PROGRAM SPACE.  IT SETS ERROR TO 12 (NOT FOUND)
00000000  2  IF THE FILE OR ITS RELOCATABLE CAN'T BE FOUND.
00000000  2  THE ADDRESSES RETURNED ARE LOGICAL ADDRESSES.
00000000  2  ******************************************************************************)
00000000  2
00000000  2  VAR
00000000  2    INDEX:S_INT;
000002E6  2
000002E6  2  BEGIN
000002E6  2
000002E6  2  ERROR:=0;
000002EC  2  IF (NOT COMPAREFILE(ABS_FILE,ADDR(L_FILE))) OR (ABS_DISC <> L_DISC)
00000314  2    THEN
00000314  2       BEGIN (* OPEN NEW FILE *)
00000314  2       OPEN_LINK_SYM(ABS_FILE,ABS_DISC,ERROR);
0000032A  2       END;  (* OPEN NEW FILE *)
0000032A  2  IF ERROR = 0
00000334  2    THEN
00000334  2       INDEX:=GET_SOURCE_INDEX(FNAME,DISC,ERROR);
```

```
00000350  2  IF ERROR = 0
0000035A  2    THEN GET_RANGE(INDEX,START_ADDR,END_ADDR,ERROR);
0000037A  2
0000037A  2  END;    (* FILE_RANGE *)
00000000  1  .

****WARNING ?? - Symbol: LABEL_10, is duplicated in the asmb_syn file.

End of compilation, number of errors=     0

00000000  1  "68000" PREPROCESS
00000000  1  $EXTENSIONS ON$
00000000  1  PROGRAM GET_GLB_ADDRESS;
00000000  1
00000000  1  #INCLUDE ERROR:INCLUD
00000000  1
00000000  1  #DEFINE IO_ERROR(ERROR,DCB)    BEGIN               \
00000000  1                                 IOERROR(ERROR,DCB);\
00000000  1                                 GOTO 10;            \
00000000  1                                 END
00000000  1
00000000  1  CONST
00000000  1    RECSIZE = 128;                      (* SIZE OF DISC RECORDS USED *)
00000000  1    ADDR_WORD = 25;
00000000  1
00000000  1
00000000  1  TYPE
00000000  1    S_INT = SIGNED_16;
00000000  1    DCBTYPE = S_INT;
00000000  1    BUFFTYPE = ARRAY [0..RECSIZE] OF S_INT;
00000000  1    NAMEPTR = ^NAME;
00000000  1    NAME = ARRAY[0..7] OF S_INT;
00000000  1    AR2_INT = ARRAY[0..1] OF S_INT;
00000000  1
00000000  1
00000000  1  VAR
00000000  1
00000000  1
00000000  1    RBUF:BUFFTYPE;
00000102  1
00000102  1  $EXTVAR+$
00000102  1    L_DISC:S_INT;
00000102  1    RANGE_START,NAME_START:S_INT;
00000102  1    L_DCB:DCBTYPE;
00000102  1    L_FILE:NAME;
00000102  1  $EXTVAR-$
00000000  1
00000000  1
00000000  1  PROCEDURE P_POSITION(VAR DCB:DCBTYPE; RECNO:S_INT; VAR ERROR:S_INT);EXTERNAL;
00000000  1  PROCEDURE P_READ(VAR DCB:DCBTYPE; VAR RBUF:BUFFTYPE; RECSIZE:S_INT;
00000000  2                    VAR ERROR:S_INT);EXTERNAL;
00000000  1  PROCEDURE IOERROR(VAR ERROR:S_INT; VAR DCB:DCBTYPE);EXTERNAL;
00000000  1  PROCEDURE OPEN_LINK_SYM(ABS_FILE:NAMEPTR; ABS_DISC:S_INT; VAR ERROR:S_INT);EXTERNAL;
00000000  1  FUNCTION COMPAREFILE(F1,F2:NAMEPTR):BOOLEAN;EXTERNAL;
00000000  1  FUNCTION COMPAREIDENT(FIRST,SECOND:NAMEPTR):BOOLEAN;EXTERNAL;
00000000  1
00000000  1  $GLOBPROC+$
00000000  1
00000000  1  PROCEDURE GET_GLB_SYM(ABS_FILE:NAMEPTR; ABS_DISC:S_INT; SPTR:NAMEPTR;
00000000  2                        VAR ADDRESS:AR2_INT; VAR ERROR:S_INT);
00000000  2  (**********************************************************************
00000000  2  THIS PROCEDURE FINDS THE ADDRESS OF THE GLOBAL SYMBOL POINTED TO BY SPTR.
00000000  2  THE LINK SYM FILE  IS SEARCHED FOR THE REQUIRED SYMBOL.
00000000  2  IF FOUND THEN THE LOGICAL ADDRESS IS RETURNED.
00000000  2  THE FOLLOWING ERRORS ARE RETURNED:
00000000  2       12 - SYMBOL NOT FOUND
00000000  2       14 - ABS_FILE IS BLANK  (NO_SYM ERROR)
00000000  2  **********************************************************************)
00000000  2  LABEL
00000000  2    10;
00000000  2
00000000  2
00000000  2  VAR
00000000  2    DONE,FOUND:BOOLEAN;
```

```
00000002  2      LENGTH:S_INT;
00000004  2      DBL_ADDR:BOOLEAN;
00000005  2      LNK_INDEX:S_INT;
00000008  2      LNK_SIZE:S_INT;
00000004  2
00000004  2
00000004  2
00000004  2   BEGIN
00000004  2
00000004  2   IF ABS_FILE^[0] = 20H
00000012  2     THEN
00000012  2       ERROR:=NO_SYM
0000001E  2     ELSE
0000001E  2       BEGIN   (* A VALID ABS_FILE NAME *)
0000001E  2       IF (NOT COMPAREFILE(ABS_FILE,ADDR(L_FILE))) OR (ABS_DISC <> L_DISC)
00000046  2         THEN
00000046  2           BEGIN (* OPEN NEW FILE *)
00000046  2           OPEN_LINK_SYM(ABS_FILE,ABS_DISC,ERROR);
0000005C  2           IF ERROR <> 0 THEN GOTO 10;
0000006A  2           END;  (* OPEN NEW FILE *)
0000006A  2       P_POSITION(L_DCB,1,ERROR);
00000082  2       IF ERROR <> 0 THEN IO_ERROR(ERROR,L_DCB);
000000A0  2       P_READ(L_DCB,RBUF,RECSIZE,ERROR);
000000BC  2       IF ERROR <> 0 THEN IO_ERROR(ERROR,L_DCB);
000000DA  2       IF SHIFT(SHIFT(RBUF[ADDR_WORD],8),-8) = 1
000000EA  2         THEN DBL_ADDR:=FALSE
000000F2  2         ELSE DBL_ADDR:=TRUE;
000000F8  2       P_READ(L_DCB,RBUF,RECSIZE,ERROR);
00000114  2       IF ERROR <> 0 THEN IO_ERROR(ERROR,L_DCB);
00000132  2       LNK_INDEX:=2;    (* SKIP THE TYPE WORD *)
00000138  2       LNK_SIZE:=SHIFT(SHIFT(RBUF[0],8),-8)-1; (* DON'T COUNT THE CHECK SUM  *)
00000146  2       DONE:=FALSE;
0000014A  2       FOUND:=FALSE;
0000014E  2       WHILE (NOT DONE) DO
00000156  2         BEGIN          (* READING LNK FILE *)
00000156  2         WHILE (LNK_INDEX <= LNK_SIZE) AND (NOT DONE) DO
00000172  2           BEGIN       (* LOOKING THROUGH A SYM REC *)
00000172  2           LENGTH:=SHIFT(RBUF[LNK_INDEX],-13)+1;
00000188  2           IF COMPAREIDENT(ADDR(RBUF[LNK_INDEX]),SPTR)
000001A4  2             THEN
000001A4  2               BEGIN  (* FOUND IT *)
000001A4  2               FOUND:=TRUE;
000001AA  2               DONE:=TRUE;
000001B0  2               ADDRESS[1]:=RBUF[LNK_INDEX+LENGTH];
000001C8  2               IF DBL_ADDR
000001D0  2                 THEN ADDRESS[0]:=RBUF[LNK_INDEX+LENGTH+1]
000001EC  2                 ELSE ADDRESS[0]:=0;
000001F2  2               END;   (* FOUND IT *)
000001F2  2           IF DBL_ADDR
000001FA  2             THEN
000001FA  2               LNK_INDEX:=LNK_INDEX+LENGTH+2
0000020C  2             ELSE
0000020C  2               LNK_INDEX:=LNK_INDEX+LENGTH+1;
0000021A  2           END;   (* LOOKING THROUGH A SYM REC *)
0000021E  2         IF NOT DONE
00000226  2           THEN
00000226  2             BEGIN  (* NEED TO READ THE NEXT RECORD *)
00000226  2             P_READ(L_DCB,RBUF,RECSIZE,ERROR);
00000242  2             IF RBUF[1] <> 2
0000024E  2               THEN
0000024E  2                 BEGIN   (* END OF GLBS *)
0000024E  2                 DONE:=TRUE;
00000254  2                 END      (* END OF GLBS *)
00000258  2               ELSE
00000258  2                 IF ERROR <> 0 THEN IO_ERROR(ERROR,L_DCB)
0000027A  2                   ELSE
0000027A  2                     BEGIN  (* A VALID READ *)
0000027A  2                     LNK_INDEX:=2;    (* SKIP THE TYPE WORD *)
00000280  2                     LNK_SIZE:=SHIFT(SHIFT(RBUF[0],8),-8)-1; (* DON'T COUNT THE CHECK SUM  *)
0000028E  2                     END;   (* A VALID READ *)
0000028E  2             END;   (* NEED TO READ NEXT RECORD *)
0000028E  2         END;         (* READING THE LNK FILE *)
00000292  2     IF NOT FOUND
0000029A  2       THEN ERROR:=NOT_FOUND;
```

```
000002A2  2       END;    (* A VALID ABS_FILE NAME *)
000002A2  2
000002A2  2  10:
000002A2  2
000002A2  2  END;         (*  GET_GLB_SYM *)
00000000  1  .
```

End of compilation, number of errors=    0

```
00000000  1  "68000" PREPROCESS
00000000  1  $EXTENSIONS ON$
00000000  1  PROGRAM LINE_TO_SUB;
00000000  1
00000000  1  CONST
00000000  1   SUB_REC_SIZE = 10;
00000000  1
00000000  1  #INCLUDE ERROR:INCLUD
00000000  1  #INCLUDE STD_DATA:SODADD
00000000  1  #INCLUDE SYMBOL:SODADB
00000000  1
00000000  1
00000000  1  $CALL_ABS_LONG ON$
00000000  1
00000000  1  PROCEDURE PROG_ADDR(PROGNO:S_INT; VAR ENTRY,EXIT:AR2_INT; VAR ERROR:S_INT);EXTERNAL;
00000000  1
00000000  1  PROCEDURE RELEASE_SUBNO(PROGNO,SUBNO:S_INT);EXTERNAL;
00000000  1
00000000  1  PROCEDURE GET_PROC_DATA(PROGNO,SUBNO:S_INT; INDEX:POINTER; VAR P:GENERIC_PTR; VAR ERROR:S_INT);EXTERNAL;
00000000  1
00000000  1  PROCEDURE OUTIT(LETTER:CHAR;VALUE:S_INT; BASI:CHAR);EXTERNAL;
00000000  1
00000000  1  FUNCTION SUB_INDEX(PROGNO,SUBNO:S_INT; VAR NEXTSUB:S_INT):POINTER;EXTERNAL;
00000000  1
00000000  1
00000000  1  $CALL_ABS_LONG$
00000000  1  PROCEDURE P_ADDR(INVAL:AR2_INT; VAR OUTVAL:AR2_INT);EXTERNAL;
00000000  1  $CALL_PC_SHORT$
00000000  1
00000000  1
00000000  1  $GLOBPROC+$
00000000  1
00000000  1
00000000  1  PROCEDURE FIND_PROC(PROGNO:S_INT; VAR MIN,MAX,ADDRESS:AR2_INT;
00000000  2                       VAR P:GENERIC_PTR; VAR ERROR:S_INT);
00000000  2  (***************************************************************************
00000000  2  THIS PROCEDURE SEARCHES ALL THE SUBROUTINES IN THE DATABASE TRYING TO
00000000  2  MATCH ADDRESS WITH THE SUBROUTINE.
00000000  2  THE ADDRESS IS MATCHED WITH THE SUBROUTINES ENTRY AND EXIT ADDRESS.
00000000  2  IF A MATCH IS FOUND P IS SET TO THE BEGINING OF THE SUBROUTINE RECORD
00000000  2  AND ERROR = 0 ELSE ERROR = -3
00000000  2  NOTE: VIRTUAL_INC DOES NOT HAVE TO BE USED SINCE A SUBROUTINE RECORD
00000000  2  ALWAYS STARTS ON A RECORD BOUNDARY.
00000000  2  ***************************************************************************)
00000000  2
00000000  2
00000000  2  VAR
00000000  2    FOUND:BOOLEAN;
00000001  2    SUBNO:S_INT;
00000004  2    NEXT_SUB:S_INT;
00000006  2    START_SUB:S_INT;
00000008  2    INDEX:POINTER;
0000000C  2    PENTRY,PEXIT:AR2_INT;
00000004  2
00000004  2  BEGIN
00000004  2
00000004  2  FOUND:=FALSE;
00000008  2  INDEX:=SUB_INDEX(PROGNO,0,NEXT_SUB);  (* THIS GIVES US A STARTING POINT, NEXT_SUB *)
0000001E  2  SUBNO:=NEXT_SUB;
00000024  2  START_SUB:=NEXT_SUB;
0000002A  2  REPEAT
0000002A  2    INDEX:=SUB_INDEX(PROGNO,SUBNO,NEXT_SUB);
00000042  2    IF INDEX <> NIL
0000004A  2       THEN
0000004A  2          BEGIN  (* SUBNO EXISTS *)
```

```
0000004A  2          GET_PROC_DATA(PROGNO,SUBNO,INDEX,P,ERROR);
0000006E  2          P_ADDR(P.SPTR^.ENTRY_ADDR,PENTRY);
00000084  2          P_ADDR(P.SPTR^.EXIT_ADDR,PEXIT);
0000009A  2          IF (UNSIGNED_32(PENTRY) <= UNSIGNED_32(ADDRESS)) AND (* ADDRESS >= ENTRY *)
0000009A  2             (UNSIGNED_32(ADDRESS) <= UNSIGNED_32(PEXIT))    (* AND ADDRESS <= EXIT *)
000000C0  2             THEN
000000C0  2                BEGIN  (* ADDRESS WITHIN THE RANGE OF THE PROCEDURE *)
000000C0  2                FOUND:=TRUE;
000000C6  2                NEXT_SUB:=START_SUB;
000000CC  2                WITH P.SPTR^ DO
000000D4  2                   BEGIN
000000D4  2                   MIN:=PENTRY;
000000DC  2                   MAX:=PEXIT;
000000E4  2                   END;
000000E4  2                END   (* ADDRESS WITHIN THE RANGE OF THE PROCEDURE *)
000000E8  2             ELSE
000000E8  2                BEGIN   (* KEEP LOOKING *)
000000E8  2                RELEASE_SUBNO(PROGNO,SUBNO);
000000F8  2                SUBNO:=NEXT_SUB;
000000FE  2                END;    (* KEEP LOOKING *)
000000FE  2          END    (* SUBNO EXITS *)
00000102  2       ELSE
00000102  2          NEXT_SUB:=START_SUB;
00000108  2 UNTIL NEXT_SUB = START_SUB;
00000114  2
00000114  2 IF NOT FOUND
0000011C  2   THEN ERROR:=NOT_FOUND
00000128  2   ELSE ERROR:=0;
0000012E  2
0000012E  2 END;  (* FIND_PROC *)
00000000  1
00000000  1 PROCEDURE LINE_SUB(PROGNO:S_INT; VAR ADDRESS:AR2_INT;
00000000  2                    VAR SUBNO,ERROR:S_INT);
00000000  2 (*******************************************************************
00000000  2   THIS PROCEDURE RETURNS THE SUBROUTINE NUMBER OF A GIVEN PHYSICAL ADDRESS.
00000000  2   IT CHECKS ALL THE ENTRY EXIT ADDRESSES OF ALL THE PROCEDURES UNTIL
00000000  2   IT FINDS ON THAT THE ADDRESS IS WITHIN.  IF NO PROCEDURE IS FOUND
00000000  2   THEN IT CHECKS TO SEE IF THE LINE NUMBER BELONGS TO THE MAIN PROGRAM
00000000  2   (SUBNO=0).  IF IS DOES NOT THEN IT RETURNS AN ERROR=3.
00000000  2 ********************************************************************)
00000000  2
00000000  2 LABEL
00000000  2   10;
00000000  2
00000000  2 VAR
00000000  2
00000000  2   FOUND:BOOLEAN;
00000001  2   P:GENERIC_PTR;
00000006  2   ENTRY,EXIT:AR2_INT;
0000000E  2   I:S_INT;
00000136  2
00000136  2
00000136  2
00000136  2 BEGIN
00000136  2 FOUND:=FALSE;
0000013A  2 FIND_PROC(PROGNO,ENTRY,EXIT,ADDRESS,P,ERROR);
00000160  2 IF ERROR = 0
0000016A  2   THEN
0000016A  2      BEGIN  (* FOUND THE ADDRESS *)
0000016A  2      FOUND:=TRUE;
00000170  2      SUBNO:=P.SPTR^.SUBNO;
0000017C  2      RELEASE_SUBNO(PROGNO,SUBNO);
0000018E  2      END;   (* FOUND THE ADDRESS *)
0000018E  2 IF NOT FOUND
00000196  2   THEN
00000196  2      BEGIN   (* SEE IF LINE IS IN MAIN PROGRAM *)
00000196  2      PROG_ADDR(PROGNO,ENTRY,EXIT,ERROR);
000001B4  2      P_ADDR(ENTRY,ENTRY);
000001C4  2      P_ADDR(EXIT,EXIT);
000001D4  2      IF (UNSIGNED_32(ENTRY) <= UNSIGNED_32(ADDRESS) ) AND      (* ADDRESS >= ENTRY *)
000001D4  2         (UNSIGNED_32(ADDRESS) <= UNSIGNED_32(EXIT) )         (* AND ADDRESS <= EXIT *)
000001FA  2         THEN
000001FA  2            BEGIN  (* ADDRESS WITHIN THE RANGE OF THE PROGRAM *)
000001FA  2            SUBNO:=0;
```

```
00000200  2            ERROR:=0;
00000206  2            END    (* ADDRESS WITHIN THE RANGE OF THE PROGRAM *)
0000020A  2          ELSE
0000020A  2            ERROR:=NOT_FOUND;
00000212  2      END;  (* SEE IF LINE IS IN MAIN PROGRAM *)
00000212  2  10:
00000212  2  END;   (* LINE_SUB *)
00000000  1  .

End of compilation, number of errors=    0

00000000  1  "68000"
00000000  1  $EXTENSIONS ON$
00000000  1  PROGRAM FLIP;
00000000  1
00000000  1
00000000  1  CONST
00000000  1    BASE_REG = 33;
00000000  1    REG_SIZE = 4;
00000000  1
00000000  1  TYPE
00000000  1    S_INT = SIGNED_16;
00000000  1    DOUBLE_WORD = RECORD
00000000  2     LSW,MSW:S_INT;
00000000  1    END;
00000000  1
00000000  1
00000000  1  $GLOBPROC+$
00000000  1  PROCEDURE FLIP_DOUBLE(INVAL:DOUBLE_WORD; VAR OUTVAL:DOUBLE_WORD);
00000004  2  (***************************************************************************
00000004  2  THIS PROCEDURE REVERSES THE ORDER (LSW,MSW) OF INVAL TO MAKE OUTVAL
00000004  2  ***************************************************************************)
00000004  2
00000004  2  BEGIN
00000004  2
00000004  2  OUTVAL.LSW:=INVAL.MSW;
00000010  2  OUTVAL.MSW:=INVAL.LSW;
0000001A  2
0000001A  2  END;   (* FLIP_DOUBLE *)
00000000  1
00000000  1  .

End of compilation, number of errors=    0

00000000  1  "68000" PREPROCESS
00000000  1  $EXTENSIONS ON$
00000000  1  PROGRAM CLOSE_THE_DB_FILES;
00000000  1
00000000  1  #INCLUDE STD_DATA:SODADB
00000000  1  #INCLUDE SYMBOL:SODADB
00000000  1
00000000  1  CONST
00000000  1    MAX_PROG = SIGNED_16(10);  (* MAX_SYMS *)
00000000  1
00000000  1  TYPE
00000000  1    NAMETYPE = ARRAY[0..7] OF S_INT;
00000000  1    PTRTYPE = ^ S_INT;
00000000  1    PROG_ARRAY=ARRAY[0..MAX_PROG-1] OF PROG_REC;
00000000  1    PROG_ARRAY_PTR=^PROG_ARRAY;
00000000  1    PROGHEAD=RECORD
00000000  2       COUNT:S_INT;
00000000  2       START:PROG_ARRAY_PTR;
00000000  1    END;
00000000  1
00000000  1    DCBREC = RECORD
00000000  2       DCB_PTR:DCBPTR;
00000000  2       DCB_OWNER:S_INT;
00000000  1    END;
00000000  1
00000000  1
00000000  1  VAR
00000000  1
00000000  1  $EXTVAR+$
00000000  1  DCB:DCBREC;
```

```
00000000  1  L_DCB:DCBTYPE;
00000000  1  L_FILE:NAME;
00000000  1  DCBLOCK:DCBTYPE;
00000000  1  SCR_DCB:S_INT;
00000000  1  ASM_DCB:DCBTYPE;
00000000  1  ASM_DCB_NO:S_INT;
00000000  1  PROG:PROGHEAD;
00000000  1  $EXTVAR-$
00000000  1
00000000  1  #INCLUDE P_PROCS:SODADB
00000000  1
00000000  1  FUNCTION PROG_HEADER(PROGNO:S_INT):PROG_PTR;EXTERNAL;
00000000  1  PROCEDURE RELEASE_SYM_SPACE(ADDRESS:PTRTYPE);EXTERNAL;
00000000  1
00000000  1  $GLOBPROC+$
00000000  1
00000000  1  PROCEDURE CLOSE_DB_FILES;
00000000  2  (*****************************************************************************
00000000  2  THIS PROCEDURE CLOSES ALL OPEN FILES IN THE DC OVERLAY SO SPACE IS
00000000  2  AVAIABLE FOR NEXT OVERLAY
00000000  2  *****************************************************************************)
00000000  2
00000000  2  VAR
00000000  2    ERROR:S_INT;
00000002  2    P:PROG_PTR;
00000004  2
00000004  2  BEGIN
00000004  2
00000004  2  P:=PROG_HEADER(DCB.DCB_OWNER);
00000012  2  IF P <> NIL
0000001A  2     THEN
0000001A  2         BEGIN  (* ITS BEEN USED *)
0000001A  2         P^.NODE_PTR:=S_UMS(0);
00000022  2         P_CLOSE(DCB.DCB_PTR^,ERROR);        (* CLOSE THE DATABASE FILE *)
00000032  2         DCB.DCB_OWNER:=-1;          (* SET OWNER TO NONE *)
00000038  2         RELEASE_SYM_SPACE(PTRTYPE(INTEGER(P^.NODE_PTR)));
0000004A  2         END;   (* ITS BEEN USED *)
0000004A  2  P_CLOSE(L_DCB,ERROR);         (* CLOSE THE LINK_SYM FILE *)
00000058  2  L_FILE[0]:=0;                 (* SET LINK FILE NAME TO NULL *)
0000005C  2  P_CLOSE(DCBLOCK,ERROR);       (* CLOSE THE SOURCE FILE *)
0000006A  2  SCR_DCB:=-1;                  (* SET PROGNO OF SOURCE FILE TO 0 *)
00000070  2  P_CLOSE(ASM_DCB,ERROR);       (* CLOSE THE ASM SYM FILE *)
0000007E  2  ASM_DCB_NO:=-1;               (* SET ASM_DCB PROG NO TO 0 *)
00000084  2  PROG.COUNT:=-1;               (* REMEMBER NOTHING ABOUT THE FILES SEEN *)
0000008A  2
0000008A  2  END;   (* CLOSE DB FILES *)
00000000  1  .
```

End of compilation, number of errors=    0

```
 "68000"
*
*   Tabs at 5, 15, 35
*
    EXTERNAL NEWPROC, SLEEP, WAKEUP, EXIT
    EXTERNAL SET_PRI, READ_PRI, SET_SIG, READ_SIG
    EXTERNAL READ_ID, READ_PID
*
    GLOBAL FORK_, SLEEP_, WAKEUP_, EXIT_
    GLOBAL SET_PRI_, READ_PRI_, SET_SIG_, READ_SIG_
    GLOBAL READ_ID_, READ_PID_
*
******************************** SYS_ENTRY ********************************
*  SYS_ENTRY is the assembly language module containing the user entry
*  points into the process manager for the Soda 68000 Operating
*  system.  The routines provided are responsible for 1) calling or
*  2) entering the system by executing a trap instruction, which gets
*  the attention of the operating system
*  Author:  Kip Fulghum
*  Date:  5-19-82  Revised:  12-7-82
******************************************************************************
*
*  All of the routines operate in user mode.  Those which must enter the
*  system push the address of the necessary process mgr routine onto the
```

```
*  current user stack, along with the number of parameter 16 bit words
*  for that routine.  A trap instruction is then executed.  All system
*  entry traps are through trap vector 0.  Some routines do not
*  actually enter the system.  They simply provide a jump to the
*  approriate routine.
*
*  SYS_ENTRY contains the following routines:
*  -SYSTEM_ENTRY enters the system via trap 0.
*  -Global procedure FORK_ ( user mode ) initiates the system routine
*   NEWPROC ( supervisor mode ).
*  -Global procedure SLEEP_ ( user mode ) initiates the system routine
*   SLEEP ( supervisor mode ).
*  -Global procedure WAKEUP_ ( user mode ) initiates the system routine
*   WAKEUP ( supervisor mode ).
*  -Global procedure EXIT_ ( user mode ) initiates the system routine
*   EXIT ( supervisor mode ).
*  -Global procedure SET_PRI_ ( user mode ) initiates the system routine
*   SET_PRI ( supervisor mode ).
*  -Global procedure READ_PRI_ ( user mode ) initiates the system
*   routine READ_PRI ( user mode ).
*  -Global procedure SET_SIG_ ( user mode ) initiates the system
*   routine SET_SIG ( user mode ).
*  -Global procedure READ_SIG_ ( user mode ) initiates the system
*   routine READ_SIG ( supervisor mode ).
*  -Global procedure READ_ID_ ( user mode ) initiates the system
*   routine READ_ID ( user mode ).
*  -Global procedure READ_PID_ ( user mode ) initiates the system
*   routine READ_PID ( user mode ).




*
*                              ************************
*                              ***** SYSTEM_ENTRY *****
*                              ************************
*
000000             SYSTEM_ENTRY
                   *  BEGIN  { SYSTEM_ENTRY
000000 4E40           TRAP      #0                   ; Trap.
000002 5C8F           ADDQ.L    #6,A7                ; Pop stuff off user stack.
000004 4E75           RTS
                   *  END    { SYSTEM_ENTRY
*
*                              ****************
*                              ***** FORK_ *****
*                              ****************
*
000006             FORK_
                   *  BEGIN  { Procedure FORK_
000006 487A 0000      PEA       NEWPROC[PC]          ; Push address of NEWPROC spvsr...
00000A 3F3C 0006      MOVE.W    #6,-[A7]             ; routine ( 6 words for params )
00000E 60F0           BRA       SYSTEM_ENTRY         ; Enter system.
                   *  END    { Procedure FORK_
*
*                              *****************
*                              ***** SLEEP_ *****
*                              *****************
*
000010             SLEEP_
                   *  BEGIN  { Procedure SLEEP_
000010 487A 0000      PEA       SLEEP[PC]            ; Push address of SLEEP spvsr...
000014 3F3C 0003      MOVE.W    #3,-[A7]             ; routine ( 3 words for params ).
000018 60E6           BRA       SYSTEM_ENTRY         ; Enter system.
                   *  END    { Procedure SLEEP_
*
*                              ******************
*                              ***** WAKEUP_ *****
*                              ******************
*
00001A             WAKEUP_
                   *  BEGIN  { Procedure WAKEUP_
00001A 487A 0000      PEA       WAKEUP[PC]           ; Push address of WAKEUP spvsr..
```

```
00001E 3F3C 0002          MOVE.W    #2,-[A7]          ; routine ( 2 words for params )
000022 60DC               BRA       SYSTEM_ENTRY      ; Enter system
                   *  END    < Procedure WAKEUP_
                   *
                   *                          *******************
                   *                          ***** EXIT_ *****
                   *                          *******************
                   *
000024             EXIT_
                   *  BEGIN  < Procedure EXIT_
000024 487A 0000          PEA       EXIT[PC]          ; Push address of EXIT supvr..
000028 3F3C 0000          MOVE.W    #0,-[A7]          ; routine ( 0 words for params )..
00002C 60D2               BRA       SYSTEM_ENTRY      ; Enter system.
                   *  END    < Procedure EXIT_
                   *
                   *                          *******************
                   *                          ***** SET_PRI_ *****
                   *                          *******************
                   *
00002E             SET_PRI_
                   *  BEGIN  < Procedure SET_PRI_
00002E 487A 0000          PEA       SET_PRI[PC]       ; Push address of SET_PRI supvr..
000032 3F3C 0001          MOVE.W    #1,-[A7]          ; routine ( 1 word for params )..
000036 60C8               BRA       SYSTEM_ENTRY      ; Enter system.
                   *  END    < Procedure SET_PRI_
                   *
                   *                          *******************
                   *                          ***** READ_PRI_ *****
                   *                          *******************
                   *
000038             READ_PRI_
                   *  BEGIN  < Procedure READ_PRI_
000038 4EFA 0000          JMP       READ_PRI[PC]      ; Jump to READ_PRI
00003C                    DS.B      6
                   *  END    < Procedure READ_PRI_
                   *
                   *                          *******************
                   *                          ***** SET_SIG_ *****
                   *                          *******************
                   *
000042             SET_SIG_
                   *  BEGIN  < Procedure SET_SIG_
000042 4EFA 0000          JMP       SET_SIG[PC]       ; Jump to SET_SIG.
000046                    DS.B      6
                   *  END    < Procedure SET_SIG_
                   *
                   *                          *******************
                   *                          ***** READ_SIG_ *****
                   *                          *******************
                   *
00004C             READ_SIG_
                   *  BEGIN  < Procedure READ_SIG_
00004C 487A 0000          PEA       READ_SIG[PC]      ; Push address of READ_SIG suvsr..
000050 3F3C 0003          MOVE.W    #3,-[A7]          ; routine ( 3 words for params )..
000054 60AA               BRA       SYSTEM_ENTRY      ; Enter system.
                   *  END    < Procedure READ_SIG_
                   *
                   *                          *******************
                   *                          ***** READ_ID_ *****
                   *                          *******************
                   *
000056             READ_ID_
                   *  BEGIN  < Procedure READ_ID_
000056 4EFA 0000          JMP       READ_ID[PC]       ; Jump to READ_ID.
00005A                    DS.B      6
                   *  END    < Procedure READ_ID_
                   *
                   *                          *******************
                   *                          ***** READ_PID_ *****
                   *                          *******************
                   *
000060             READ_PID_
                   *  BEGIN  < Procedure READ_PID_
000060 4EFA 0000          JMP       READ_PID[PC]      ; Jump to READ_ID.
```

```
000064          DS.B    6
          *  END    < Procedure READ_PID_
                END

Errors=  0

          "68000"
          *
          *   Tabs at 5, 15, 35
          *
          *
               GLOBAL FORK_, SLEEP_, WAKEUP_, EXIT_
               GLOBAL SET_PRI_, READ_PRI_, SET_SIG_, READ_SIG_
               GLOBAL READ_ID_, READ_PID_
          *
          *********************************** SYSTEM ***********************************
          *  SYSTEM is the dummy assembly language module containing the user
          *  entry points into the process manager for the Soda 68000 Operating
          *  System.  It is a dummy module for programs to link to ( no-loaded ).
          *  Author:  Kip Fulghum
          *  Date:  5-18-82  Revised:  5-25-82
          ******************************************************************************
          *
000000          DS.B    6
          *
          *                             ******************
          *                             ***** FORK_ *****
          *                             ******************
          *
000006    FORK_
          *  BEGIN  < Procedure FORK_
000006          DS.B    10
          *  END    < Procedure FORK_
          *
          *                             ******************
          *                             ***** SLEEP_ *****
          *                             ******************
          *
000010    SLEEP_
          *  BEGIN  < Procedure SLEEP_
000010          DS.B    10
          *  END    < Procedure SLEEP_
          *
          *                             ******************
          *                             ***** WAKEUP_ *****
          *                             ******************
          *
00001A    WAKEUP_
          *  BEGIN  < Procedure WAKEUP_
00001A          DS.B    10
          *  END    < Procedure WAKEUP_
          *
          *                             ******************
          *                             ***** EXIT_ *****
          *                             ******************
          *
000024    EXIT_
          *  BEGIN  < Procedure EXIT_
000024          DS.B    10
          *  END    < Procedure EXIT_
          *
          *                             *********************
          *                             ***** SET_PRI_ *****
          *                             *********************
          *
00002E    SET_PRI_
          *  BEGIN  < Procedure SET_PRI_
00002E          DS.B    10
          *  END    < Procedure SET_PRI_
          *
          *                             **********************
          *                             ***** READ_PRI_ *****
          *                             **********************
          *
000038    READ_PRI_
```

```
        *  BEGIN  ( Procedure READ_PRI_
000038        DS.B       10
        *  END    ( Procedure READ_PRI_
        *
        *                              *********************
        *                              ***** SET_SIG_ *****
        *                              *********************
        *
000042  SET_SIG_
        *  BEGIN  ( Procedure SET_SIG_
000042        DS.B       10
        *  END    ( Procedure SET_SIG_
        *
        *                              *********************
        *                              ***** READ_SIG_ *****
        *                              *********************
        *
00004C  READ_SIG_
        *  BEGIN  ( Procedure READ_SIG_
00004C        DS.B       10
        *  END    ( Procedure READ_SIG_
        *
        *                              *********************
        *                              ***** READ_ID_ *****
        *                              *********************
        *
000056  READ_ID_
        *  BEGIN  ( Procedure READ_ID_
000056        DS.B       10
        *  END    ( Procedure READ_ID_
        *
        *                              *********************
        *                              ***** READ_PID_ *****
        *                              *********************
        *
000060  READ_PID_
        *  BEGIN  ( Procedure READ_PID_
000060        DS.B       10
        *  END    ( Procedure READ_PID_
              END

errors=    0

00000000  1  "68000" PREPROCESS
00000000  1  $EXTENSIONS ON$
00000000  1  $TITLE "Soda 68000 Operating System Process Manager"$
00000000  1  PROGRAM PROC_MGR;
00000000  1  (*
00000000  1  ****************************** PROC_MGR ******************************
00000000  1    PROC_MGR is the process manager for the Soda 68000 Operating System.
00000000  1    It is a multi-tasking, priority based process manager which allows
00000000  1    sleep and wake-up as well as fork and exit of prioritized tasks.
00000000  1    Author:  Kip Fulghum
00000000  1    Date:  5-10-82    Revised:  4-5-83
00000000  1  ************************************************************************
00000000  1
00000000  1    PROC_MGR is a collection of routines which, along with the assembly
00000000  1    language support routines contained in APROC_MGR, accomplish all
00000000  1    the necessary process management functions.  With this set of
00000000  1    routines, a process can create a process, change its priority,
00000000  1    sleep until a certain event occurs, send/receive signals to/from
00000000  1    immediate relatives, remove itself from further processing, etc.
00000000  1    This multi-tasking, prioritized scheme is sufficient ( hopefully )
00000000  1    for Soda's needs.
00000000  1
00000000  1    PROC_MGR contains the following routines:
00000000  1    -Function LIMIT_PRI makes sure that a given priority is within
00000000  1     the legal limits.
00000000  1    -Procedure RELEASE releases an entry in the process array and packs
00000000  1     an active entry in its place.
00000000  1    -Procedure ARISE restores the given process to an active state ( ie
00000000  1     run state ).
00000000  1    -Global procedure SWITCH switches user process contexts from the
```

```
00000000 1      current process ( defined on the supervisor stack --> its user
00000000 1      stack ) to the highest pending priority task ( defined on its user
00000000 1      stack --> supervisor stack ).
00000000 1     -Global procedure NEWPROC creates a new entry in the process array
00000000 1      given the process and process' stack addresses.
00000000 1     -Global procedure SLEEP puts the current user process to sleep ( ie
00000000 1      suspended state ) until a given signal is received.
00000000 1     -Global procedure WAKEUP restores all processes sleeping on the given
00000000 1      channel to an active state ( ie run state ).
00000000 1     -Global procedure EXIT removes a process from further execution:
00000000 1      its status is set in limbo.
00000000 1     -Global procedure CLOCK performs the basic time book keeping for
00000000 1      all processes.
00000000 1     -Global procedure SET_PRI resets the current process' priority
00000000 1      to the given value.
00000000 1     -Global procedure READ_PRI returns the current process' priority.
00000000 1     -Global procedure SET_SIG sets a signal indicator in the current
00000000 1      process.
00000000 1     -Global procedure READ_SIG reads the signal indicator of the given
00000000 1      process.  If the given process is a zombie, it is put out of its
00000000 1      misery.
00000000 1     -Global procedure READ_ID returns the current process' I.D.
00000000 1     -Global procedure READ_PID returns the current process' parent
00000000 1      I.D.
00000000 1
00000000 1     In addition, the following external routines are used:  SAVE_USER,
00000000 1     RESTORE_USER, CREATE_USER, PANIC.
00000000 1                                                                    *)
00000000 1   (*
00000000 1                        **************************
00000000 1                        ***** Include Files *****
00000000 1                        **************************
00000000 1                                                                    *)
00000000 1
00000000 1   %INCLUDE SYS_TYPES.GS_OS
00000000 1
00000000 1   VAR
00000000 1
00000000 1   %GLOBVAR ON%
00000000 1     G_PROC_ARRAY:  PROC_ARRAY; (* Famous and omnipotent process
00000200 1                                  array.  Must be initialized *)
00000200 1
00000200 1     G_CUR_PROC  :  S_INT; (* Current active user process.  Initialized
00000202 1                             to 0 *)
00000202 1
00000202 1     G_TOP_PROC  :  S_INT; (* Current top of active processes in
00000204 1                             process array.  Initialized to 0 *)
00000204 1
00000204 1     G_RUN_RUN   :  S_INT; (* Non-zero indicates higher priority task
00000206 1                             is pending.  Initialized to 0 *)
00000206 1
00000206 1     G_P_ID      :  S_INT; (* NEWPROC's unique process I.D. counter.
00000208 1                             Initialized to 0 *)
00000208 1   %GLOBVAR OFF%
00000000 1
00000000 1
00000000 1
00000000 1
00000000 1
00000000 1   (*
00000000 1                        **********************
00000000 1                        ***** SAVE_USER *****
00000000 1                        **********************
00000000 1                                                                    *)
00000000 1   PROCEDURE SAVE_USER ( VAR UPTR:  L_INT ); EXTERNAL;
00000000 1   (*
00000000 1     Procedure SAVE_USER to move the current user process context
00000000 1     from the supervisor stack to the current user stack.  Provided as
00000000 1     an assembly language external.
00000000 1                                                                    *)
00000000 1
00000000 1
00000000 1
00000000 1
00000000 1
```

```
00000000  1
00000000  1  (*
00000000  1                          *************************
00000000  1                          ***** RESTORE_USER *****
00000000  1                          *************************
00000000  1                                                                  *)
00000000  1  PROCEDURE RESTORE_USER ( UPTR:  L_INT ); EXTERNAL;
00000000  1  (*
00000000  1    Procedure RESTORE_USER to move the given user process context
00000000  1    from the given user stack to the supervisor stack.  Provided as
00000000  1    an assembly language external.
00000000  1                                                                  *)
00000000  1
00000000  1
00000000  1
00000000  1
00000000  1
00000000  1  (*
00000000  1                           ************************
00000000  1                           ***** CREATE_USER *****
00000000  1                           ************************
00000000  1                                                                  *)
00000000  1  PROCEDURE CREATE_USER ( ADDR:  L_INT; VAR STACK:  L_INT ); EXTERNAL;
00000000  1  (*
00000000  1    Procedure CREATE_USER to initialize the given user stack to prepare
00000000  1    it for run status and a context switch.  Provided as an assembly
00000000  1    language external
00000000  1                                                                  *)
00000000  1
00000000  1
00000000  1
00000000  1
00000000  1
00000000  1  (*
00000000  1                              ******************
00000000  1                              ***** PANIC *****
00000000  1                              ******************
00000000  1                                                                  *)
00000000  1  PROCEDURE PANIC ( CODE:  PANIC_TYPE ); EXTERNAL;
00000000  1  (*
00000000  1    Procedure PANIC to handle all difficult or catastrophic failures in
00000000  1    the process manager.  Provided as a Pascal/assembly language external.
00000000  1                                                                  *)
00000000  1
00000000  1
00000000  1
00000000  1
00000000  1
00000000  1  (*
00000000  1                            **********************
00000000  1                            ***** LIMIT_PRI *****
00000000  1                            **********************
00000000  1                                                                  *)
00000000  1  FUNCTION LIMIT_PRI ( GIVEN_PRI:  S_INT ):  PRI_TYPE;
00000004  2  (*
00000004  2    Function LIMIT_PRI to make sure that a given priority is within
00000004  2    the legal limits.  If the prioriy is too high ( low ), the
00000004  2    highest ( lowest ) priority is returned.  Otherwise, the input
00000004  2    priority is returned.
00000004  2
00000004  2    Input:  1) GIVEN_PRI, the priority to be checked
00000004  2    Output:  1) the appropriate priority as described above, in function
00000004  2                name
00000004  2                                                                  *)
00000004  2  BEGIN (* Function LIMIT_PRI *)
00000004  2    (* Check to make sure that given priority is legal *)
00000004  2    IF GIVEN_PRI < MAX_PRI
00000010  2      THEN (* Given priority is too high *)
00000010  2        LIMIT_PRI := MAX_PRI
0000001A  2      ELSE (* Given priority is not too high *)
0000001A  2        IF GIVEN_PRI > MIN_PRI
00000026  2          THEN (* Given priority is too low *)
00000026  2            LIMIT_PRI := MIN_PRI
```

```
00000030 2         ELSE (* Given priority is legal *)
00000030 2           LIMIT_PRI := GIVEN_PRI
00000038 2  END; (* Function LIMIT_PRI *)
00000000 1
00000000 1
00000000 1
00000000 1
00000000 1
00000000 1  (*
00000000 1                          *******************
00000000 1                          ***** RELEASE *****
00000000 1                          *******************
00000000 1                                                                       *)
00000000 1  PROCEDURE RELEASE ( RELEASE_INDEX:  NUM_PROCS );
00000048 2  (*
00000048 2    Procedure RELEASE to release an entry in the process array.  Procedure
00000048 2    packs the upper most active entry in the released entry's place so
00000048 2    all active entries are towards the start of the process array and all
00000048 2    null entries are towards the end.
00000048 2
00000048 2    Input:  1) RELEASE_INDEX, the index into the process array of the
00000048 2               entry to be released
00000048 2    Output:  none
00000048 2             ( potentially two entries in G_PROC_ARRAY are modified,
00000048 2               along with G_CUR_PROC and G_TOP_PROC )
00000048 2                                                                       *)
00000048 2  BEGIN (* Procedure RELEASE *)
00000048 2    (* Release entry in process array *)
00000048 2    IF RELEASE_INDEX < G_TOP_PROC
00000056 2      THEN (* This is not the upper most active entry *)
00000056 2        BEGIN (* Move upper most entry down here *)
00000056 2          G_PROC_ARRAY [ RELEASE_INDEX ] := G_PROC_ARRAY [ G_TOP_PROC ];
00000072 2          IF G_CUR_PROC = G_TOP_PROC
0000007E 2            THEN (* Just moved the current process *)
0000007E 2              G_CUR_PROC := RELEASE_INDEX
00000088 2        END; (* Move upper most entry down here *)
00000088 2    G_PROC_ARRAY [ G_TOP_PROC ].P_STAT := NULL;
0000009C 2    (* Reset top of array *)
0000009C 2    G_TOP_PROC := G_TOP_PROC - 1
000000A0 2  END; (* Procedure RELEASE *)
00000000 1
00000000 1
00000000 1
00000000 1
00000000 1
00000000 1  (*
00000000 1                          *****************
00000000 1                          ***** ARISE *****
00000000 1                          *****************
00000000 1                                                                       *)
00000000 1  PROCEDURE ARISE ( WAKE_INDEX:  NUM_PROCS );
000000A8 2  (*
000000A8 2    Procedure ARISE to restore the given process to an active state ( ie
000000A8 2    run state ).  If the given process being awakened has a higher
000000A8 2    priority than the current process, a context switch is requested.
000000A8 2
000000A8 2    Input:  1) WAKE_INDEX, the index into the process array of the
000000A8 2               entry to be awakened
000000A8 2    Output:  none
000000A8 2             ( Global G_RUN_RUN, and an entry in G_PROC_ARRAY are
000000A8 2               potentially modified )
000000A8 2                                                                       *)
000000A8 2  BEGIN (* Procedure ARISE *)
000000A8 2    WITH G_PROC_ARRAY [ WAKE_INDEX ] DO
000000BC 2      BEGIN (* Wake the lazy bum up *)
000000BC 2        P_WCHAN := 0;
000000C0 2        P_STAT := RUN;
000000CA 2        IF P_PRI < G_PROC_ARRAY [ G_CUR_PROC ].P_PRI
000000E8 2          THEN (* Get ready to kick SWITCH into action *)
000000E8 2            G_RUN_RUN := G_RUN_RUN + 1
000000EC 2      END (* Wake the lazy bum up *)
000000EC 2  END; (* Procedure ARISE *)
00000000 1
00000000 1
```

```
00000000 1
00000000 1
00000000 1
00000000 1  (*
00000000 1                              ******************
00000000 1                              ***** SWITCH *****
00000000 1                              ******************
00000000 1                                                                        *)
00000000 1  $GLOBPROC ONS
00000000 1  PROCEDURE SWITCH;
00000000 2  (*
00000000 2    Global procedure SWITCH to switch user process contexts from the
00000000 2    current process ( defined on the supervisor stack --> its user
00000000 2    stack ) to the highest pending priority task ( defined on its user
00000000 2    stack --> supervisor stack ).
00000000 2
00000000 2    It is assumed that SWITCH is entered in supervisor mode and that
00000000 2    it will not be re-entered!  This is required because of its
00000000 2    references to global static structures and the assumptions it
00000000 2    makes about the current supervisor and user stacks.  Upon
00000000 2    entry, it assumes the current supervisor stack looks like
00000000 2    the following:
00000000 2
00000000 2            Supervisor Stack
00000000 2            ----------------
00000000 2         |         .          |
00000000 2         |         .          |
00000000 2         |         .          |
00000000 2         |--------------------|
00000000 2         |   Cur. user PC     |
00000000 2         |--------------------|
00000000 2         |   Cur. user SR     |
00000000 2         |--------------------|
00000000 2         |  .  Registers    . |
00000000 2         |  .    A6-A0,     . |
00000000 2         |  .    D7-D0      . |
00000000 2         |--------------------|
00000000 2       ->|         0          |
00000000 2       | |--------------------|
00000000 2       | |         .          |
00000000 2       --|         .          |
00000000 2       ->|         .          |
00000000 2       | |         .          |
00000000 2       | |--------------------|
00000000 2       --|     prev. A6       | <-- Top of supervisor stack ( grows
00000000 2         |--------------------|       downward )
00000000 2         |         v          |
00000000 2
00000000 2    It is also assumed that the current user stack pointer is in the
00000000 2    processor's USP.
00000000 2
00000000 2    SWITCH uses the following procedures and functions:  SAVE_USER,
00000000 2    RESTORE_USER, and PANIC.
00000000 2
00000000 2    Input:  none
00000000 2    Output:  none
00000000 2             ( Globals G_RUN_RUN, G_CUR_PROC, and an entry in
00000000 2               G_PROC_ARRAY are modified )
00000000 2                                                                        *)
00000000 2  VAR
00000000 2
00000000 2    NEXT_PROCESS:  S_INT; (* Index of next process to run *)
00000002 2
00000002 2    CUR_PRI     :  S_INT; (* Highest priority found so far *)
00000004 2
00000004 2    INDEX       :  S_INT; (* Index into process array *)
00000006 2
00000006 2    I           :  NUM_PROCS; (* FOR loop index *)
000000F4 2
000000F4 2  BEGIN (* Procedure SWITCH *)
000000F4 2    (* Save current process context *)
000000F4 2    SAVE_USER ( G_PROC_ARRAY [ G_CUR_PROC ].P_ADDR );
00000108 2    G_RUN_RUN := 0;
0000010C 2    CUR_PRI := MIN_PRI + 1; (* Set current priority to lower than
```

```
00000112  2                               lowest possible priority *)
00000112  2    NEXT_PROCESS := -1;
00000118  2    INDEX := G_CUR_PROC; (* Define starting index into process array
0000011E  2                           to reduce bias towards processes at the
0000011E  2                           beginning of the array *)
0000011E  2    FOR I := 0 TO G_TOP_PROC DO
00000134  2      WITH G_PROC_ARRAY [ INDEX ] DO
00000146  2        BEGIN (* Find highest priority task ready to run *)
00000146  2          IF ( P_STAT = RUN ) AND ( P_PRI < CUR_PRI )
0000016A  2            THEN (* Found a process ready to run with higher priority *)
0000016A  2              BEGIN (* Remember this process *)
0000016A  2                CUR_PRI := P_PRI;
00000174  2                NEXT_PROCESS := INDEX
0000017A  2              END; (* Remember this process *)
0000017A  2          INDEX := INDEX + 1;
0000017E  2          IF INDEX > G_TOP_PROC
0000018A  2            THEN (* Past top of active entries in process array:  reset
0000018A  2                    index *)
0000018A  2              INDEX := 0
0000018E  2        END; (* Find highest priority task ready to run *)
000001A0  2    IF NEXT_PROCESS = -1
000001AC  2      THEN (* Uh-oh:  no processes to run:  time to panic *)
000001AC  2        PANIC ( SWITCH_VALUE )
000001BC  2      ELSE (* Found a process:  get it going *)
000001BC  2        BEGIN (* Restore next process context *)
000001BC  2          RESTORE_USER ( G_PROC_ARRAY [ NEXT_PROCESS ].P_ADDR );
000001D0  2          G_CUR_PROC := NEXT_PROCESS
000001D6  2        END (* Restore next process context *)
000001D6  2  END; (* Procedure SWITCH *)
00000000  1  $GLOBPROC OFF$
00000000  1
00000000  1
00000000  1
00000000  1
00000000  1
00000000  1  (*
00000000  1                            ********************
00000000  1                            ***** NEWPROC *****
00000000  1                            ********************
00000000  1                                                                  *)
00000000  1  $GLOBPROC ON$
00000000  1  PROCEDURE NEWPROC ( PROC_ADDR, PROC_STACK:  L_INT; VAR ID:  S_INT );
00000000  2  (*
00000000  2    Global procedure NEWPROC to create a new entry in the process array
00000000  2    given the process and process' stack addresses.  Procedure uses the
00000000  2    first open entry in process array, then assigns all values in the
00000000  2    entry appropriately.  If there is no opening in the array,
00000000  2    PANIC is called to bomb out.
00000000  2
00000000  2    NEWPROC uses the following procedures and functions:  CREATE_USER,
00000000  2    RELEASE, and PANIC.
00000000  2
00000000  2    Input:  1) PROC_ADDR, the entry address of the process
00000000  2            2) PROC_STACK, the address of the process stack
00000000  2    Output:  1) ID, the I.D. assigned to the new process
00000000  2             ( Global G_P_ID and an entry in G_PROC_ARRAY are modified )
00000000  2                                                                  *)
00000000  2  VAR
00000000  2
00000000  2    INDEX  :  S_INT; (* Index into process array *)
00000002  2
00000002  2    NEXT_ZOMBIE:  S_INT; (* Zombie process with "least amount of time" *)
00000004  2
00000004  2    ZOMBIE_TIME:  S_INT; (* Zombie with "least amount of time" time
00000006  2                           count *)
00000006  2
00000006  2    RESTART:  BOOLEAN; (* Flag indicating duplicate process I.D. #s *)
000001DE  2
000001DE  2  BEGIN (* Procedure NEWPROC *)
000001DE  2    NEXT_ZOMBIE := -1;
000001E4  2    ZOMBIE_TIME := MAX_SLEEP_TIME + 1;
000001EA  2    REPEAT (* Find unique process I.D. *)
000001EA  2      G_P_ID := G_P_ID + 1;
000001EE  2      IF G_P_ID < 0
```

```
000001F6  2        THEN (* Only allow positive process I.D.s *)
000001F6  2          G_P_ID := 1;
000001FC  2      INDEX := 0;
00000200  2      RESTART := FALSE;
00000204  2      REPEAT (* Check for duplicate process I.D. *)
00000204  2        WITH G_PROC_ARRAY [ INDEX ] DO
00000216  2          BEGIN (* Find I.D. *)
00000216  2            IF ( P_STAT = ZOMBIE ) AND ( P_WCHAN < ZOMBIE_TIME )
0000023A  2              THEN (* Found a zombie with less time *)
0000023A  2                BEGIN (* Update next available zombie *)
0000023A  2                  NEXT_ZOMBIE := INDEX;
00000240  2                  ZOMBIE_TIME := P_WCHAN
00000248  2                END; (* Update next available zombie *)
00000248  2            IF ( P_ID = G_P_ID ) AND ( P_STAT <> NULL )
0000026E  2              THEN (* Duplicate active process I.D.s *)
0000026E  2                RESTART := TRUE
00000278  2              ELSE (* Not a duplicate I.D. *)
00000278  2                INDEX := INDEX + 1
0000027C  2          END (* Find I.D. *)
0000027C  2      UNTIL ( RESTART = TRUE ) OR ( INDEX > G_TOP_PROC )
0000029E  2      (* Until duplicate I.D. is found or have gone through all
0000029E  2         active entries in process array *)
0000029E  2    UNTIL RESTART = FALSE; (* Until unique I.D. is found *)
000002A6  2    IF ( G_TOP_PROC = MAX_PROCS - 1 ) AND ( NEXT_ZOMBIE = -1 )
000002C8  2      THEN (* Gotcha:  system is packed and there is no more room *)
000002C8  2        PANIC ( NEWPROC_VALUE )
000002D8  2      ELSE (* There is at least one slot left in process array *)
000002D8  2        BEGIN (* Create new entry in process array *)
000002D8  2          (* Set up user stack, stack pointer *)
000002D8  2          CREATE_USER ( PROC_ADDR, PROC_STACK );
000002E6  2          IF G_TOP_PROC = MAX_PROCS - 1
000002F2  2            THEN (* No more empty entries in process array *)
000002F2  2              RELEASE ( NEXT_ZOMBIE ); (* Use zombie entry *)
000002FE  2          G_TOP_PROC := G_TOP_PROC + 1;
00000302  2          (* Set up process array *)
00000302  2          WITH G_PROC_ARRAY [ G_TOP_PROC ] DO
00000314  2            BEGIN (* Set new P_ADDR, P_TIME, P_CPU, P_ID, P_PID, P_STAT,
00000314  2                    P_SIG, P_WCHAN, set the same P_PRI *)
00000314  2              P_ADDR := PROC_STACK;
00000318  2              P_TIME := 0;
00000320  2              P_CPU := 0;
00000328  2              P_ID := G_P_ID;
00000332  2              P_PID := G_PROC_ARRAY [ G_CUR_PROC ].P_ID;
0000034A  2              P_STAT := RUN;
00000354  2              P_PRI := G_PROC_ARRAY [ G_CUR_PROC ].P_PRI;
0000036C  2              P_SIG := 0;
00000374  2              P_WCHAN := 0
0000037C  2            END; (* Set new P_ADDR, P_TIME, P_CPU, P_ID, P_PID, P_STAT,
0000037C  2                   P_SIG, P_WCHAN, set the same P_PRI *)
0000037C  2          ID := G_P_ID (* Return process I.D. *)
00000384  2        END (* Create new entry in process array *)
00000384  2  END; (* Procedure NEWPROC *)
00000000  1  $GLOBPROC OFF$
00000000  1
00000000  1
00000000  1
00000000  1
00000000  1
00000000  1  (*
00000000  1                              *****************
00000000  1                              ***** SLEEP *****
00000000  1                              *****************
00000000  1                                                                  *)
00000000  1  $GLOBPROC ON$
00000000  1  PROCEDURE SLEEP ( CHAN:  L_INT; PRI:  S_INT );
0000038C  2  (*
0000038C  2    Global procedure SLEEP to put the current user process to sleep ( ie
0000038C  2    suspended state ) until a given signal is received.  Procedure makes
0000038C  2    sure that the given awakening priority is legal, then puts process
0000038C  2    to sleep on the given channel with the given awakening priority
0000038C  2    and initiates a context switch.
0000038C  2
0000038C  2    If the given channel is <= MAX_SLEEP_TIME, the signal is assumed
```

```
0000038C  2      to be a count of systen clocks, ie a sleep for a period of tine.
0000038C  2      After that tine, the process will be awakened.
0000038C  2
0000038C  2      SLEEP uses the following procedures and functions:  SWITCH and
0000038C  2      LIMIT_PRI.
0000038C  2
0000038C  2      Input:  1) CHAN, the channel the process wishes to sleep on ( ie
0000038C  2                 the signal required to wake up the process )  or
0000038C  2                 the # of systen clocks to sleep for ( if CHAN <=
0000038C  2                 MAX_SLEEP_TIME )
0000038C  2              2) PRI, the priority the process is to have when it wakes up
0000038C  2      Output:  none
0000038C  2               ( An entry in G_PROC_ARRAY is modified )
0000038C  2                                                                        *)
0000038C  2   BEGIN (* Procedure SLEEP *)
0000038C  2     IF CHAN <> 0
00000394  2       THEN (* Process really wants to sleep *)
00000394  2         WITH G_PROC_ARRAY [ G_CUR_PROC ] DO
000003A6  2           BEGIN (* Mighty-night *)
000003A6  2             (* Set wake-up priority *)
000003A6  2             P_PRI := LIMIT_PRI ( PRI );
000003BE  2             (* Set reason for sleeping ( event to wake up on ) *)
000003BE  2             P_WCHAN := CHAN;
000003C8  2             (* Put process to sleep *)
000003C8  2             P_STAT := DOZE;
000003D0  2             (* Call SWITCH to get next process set up to run *)
000003D0  2             SWITCH
000003D4  2           END (* Mighty-night *)
000003D4  2   END; (* Procedure SLEEP *)
00000000  1   $GLOBPROC OFF$
00000000  1
00000000  1
00000000  1
00000000  1
00000000  1
00000000  1   (*
00000000  1                                  ******************
00000000  1                                  ***** WAKEUP *****
00000000  1                                  ******************
00000000  1                                                                        *)
00000000  1   $GLOBPROC ON$
00000000  1   PROCEDURE WAKEUP ( CHAN:  L_INT );
00000000  2   (*
00000000  2     Global procedure WAKEUP to restore all processes sleeping on the given
00000000  2     channel to an active state ( ie run state ).  Procedure searches
00000000  2     process array for all processes sleeping on the given channel.  If
00000000  2     any process being awakened has a higher priority than the current
00000000  2     process, a context switch is requested.
00000000  2
00000000  2     WAKEUP uses the following procedure:  ARISE.
00000000  2
00000000  2     Input:  1) CHAN, the signal the current process wishes to wake
00000000  2                everybody up with ( ie the channel the process went to
00000000  2                sleep on )
00000000  2     Output:  none
00000000  2                                                                        *)
00000000  2   VAR
00000000  2
00000000  2     I:  NUM_PROCS; (* FOR loop index *)
000003DC  2
000003DC  2   BEGIN (* Procedure WAKEUP *)
000003DC  2     FOR I := 0 TO G_TOP_PROC DO
000003F2  2       WITH G_PROC_ARRAY [ I ] DO
00000406  2         IF ( P_WCHAN = CHAN ) AND ( P_STAT = DOZE )
00000424  2           THEN (* Found somebody to wake up *)
00000424  2             ARISE ( I ) (* Wake them up *)
00000440  2   END; (* Procedure WAKEUP *)
00000000  1   $GLOBPROC OFF$
00000000  1
00000000  1
00000000  1
00000000  1
00000000  1
00000000  1   (*
```

```
00000000 1                      *****************
00000000 1                      ***** EXIT *****
00000000 1                      *****************
00000000 1                                                          *)
00000000 1  $GLOBPROC ON$
00000000 1  PROCEDURE EXIT;
00000000 2  (*
00000000 2    Global procedure EXIT to remove a process from further execution:
00000000 2    its status is set in limbo.  Procedure wakes up the parent
00000000 2    process ( if any ) and finds all children process' and sets their
00000000 2    parent indicators to indicate they are "wards of the state" ( process
00000000 2    0 ).  SWITCH is then called to activate the next process.
00000000 2
00000000 2    EXIT uses the following procedures and functions:  SWITCH and ARISE.
00000000 2
00000000 2    Input:  none
00000000 2    Output:  none
00000000 2            ( An entry in G_PROC_ARRAY is modified )
00000000 2                                                          *)
00000000 2  VAR
00000000 2
00000000 2    I:  NUM_PROCS; (* FOR loop index *)
00000448 2
00000448 2  BEGIN (* Procedure EXIT *)
00000448 2    WITH G_PROC_ARRAY [ G_CUR_PROC ] DO
0000045A 2      BEGIN (* Suspend process *)
0000045A 2        P_STAT := ZOMBIE;
00000460 2        P_WCHAN := MAX_SLEEP_TIME (* Get rid of process after
0000046C 2                                 MAX_SLEEP_TIME *)
0000046C 2      END; (* Suspend process *)
0000046C 2    FOR I := 0 TO G_TOP_PROC DO
00000482 2      WITH G_PROC_ARRAY [ I ] DO
00000496 2        BEGIN (* Wake up the parent and adopt kids *)
00000496 2          IF ( P_ID = G_PROC_ARRAY [ G_CUR_PROC ].P_PID ) AND
00000496 2             ( P_STAT = DOZE )
000004BE 2            THEN (* This guy is the parent of the dying process and
000004BE 2                    is sleeping *)
000004BE 2              (* Wake him up no matter what he was sleeping on *)
000004BE 2              ARISE ( I );
000004C8 2          IF P_PID = G_PROC_ARRAY [ G_CUR_PROC ].P_ID
000004E6 2            THEN (* This guy is a kid of the dying process *)
000004E6 2              (* Indicate that kid has been adopted by process 0 *)
000004E6 2              P_PID := 1
000004EC 2        END; (* Wake up the parent and adopt kids *)
000004FE 2    SWITCH (* Say goodbye to this process forever *)
00000502 2  END; (* Procedure EXIT *)
00000000 1  $GLOBPROC OFF$
00000000 1
00000000 1
00000000 1
00000000 1
00000000 1
00000000 1  (*
00000000 1                      *****************
00000000 1                      ***** CLOCK *****
00000000 1                      *****************
00000000 1                                                          *)
00000000 1  $GLOBPROC ON$
00000000 1  PROCEDURE CLOCK;
00000000 2  (*
00000000 2    Global procedure CLOCK to perform the basic time book keeping for
00000000 2    all processes.  It increments all total times for all active
00000000 2    processes, and increments the CPU time for the current process.
00000000 2    If a process is sleeping for an amout of time and that delay
00000000 2    has occured, he is awakened. Also, all "walking dead" processes
00000000 2    are released.
00000000 2
00000000 2    CLOCK uses the following procedures and functions:  ARISE and
00000000 2    RELEASE.
00000000 2
00000000 2    Input:  none
00000000 2    Output:  none
00000000 2            ( Entries in G_PROC_ARRAY are modified )
00000000 2                                                          *)
```

```
00000000  2  VAR
00000000  2
00000000  2    INDEX:  S_INT; (* REPEAT loop index *)
0000050A  2
0000050A  2  BEGIN (* Procedure CLOCK *)
0000050A  2    INDEX := 0;
0000050E  2    REPEAT
0000050E  2      WITH G_PROC_ARRAY [ INDEX ] DO
00000520  2        BEGIN (* Increment process total time *)
00000520  2          P_TIME := P_TIME + 1; (* Ignore negative times *)
0000052A  2          IF ( P_WCHAN > 0 ) AND ( P_WCHAN <= MAX_SLEEP_TIME )
0000054E  2            THEN (* Process is time sleeping *)
0000054E  2              BEGIN (* See if he's had enough *)
0000054E  2                P_WCHAN := P_WCHAN - 1;
00000558  2                IF P_WCHAN = 0
00000564  2                  THEN (* Time to get up *)
00000564  2                    IF P_STAT = ZOMBIE
00000570  2                      THEN (* Time to kill *)
00000570  2                        BEGIN (* Say goodbye *)
00000570  2                          RELEASE ( INDEX );
0000057C  2                          INDEX := INDEX - 1 (* Back up one *)
00000580  2                        END (* Say goodbye *)
00000584  2                      ELSE (* Someone needs to wake up out of a timed
00000584  2                              sleep *)
00000584  2                        ARISE ( INDEX )
00000590  2              END; (* See if he's had enough *)
00000590  2          INDEX := INDEX + 1
00000594  2        END (* Increment process total time *)
00000594  2    UNTIL INDEX > G_TOP_PROC; (* Until all processes have been updated *)
000005A0  2    (* Increment current process CPU time:  ignore neg. time *)
000005A0  2    WITH G_PROC_ARRAY [ G_CUR_PROC ] DO
000005B2  2      P_CPU := P_CPU + 1
000005BC  2  END; (* Procedure CLOCK *)
00000000  1  $GLOBPROC OFF$
00000000  1
00000000  1
00000000  1
00000000  1
00000000  1
00000000  1  (*
00000000  1                          ********************
00000000  1                          ***** SET_PRI *****
00000000  1                          ********************
00000000  1                                                              *)
00000000  1  $GLOBPROC ON$
00000000  1  PROCEDURE SET_PRI ( PRI:  S_INT );
000005C4  2  (*
000005C4  2    Global procedure SET_PRI to reset the current process' priority
000005C4  2    to the given value.  Procedure makes sure that given priority
000005C4  2    is legal, then resets current process priority to that value.
000005C4  2    If the new priority is lower than the current priority, a
000005C4  2    context switch is requested.
000005C4  2
000005C4  2    SET_PRI uses the following function:  LIMIT_PRI.
000005C4  2
000005C4  2    Input:  PRI, the new priority of the current task.
000005C4  2    Output:  none
000005C4  2             ( Global G_RUN_RUN, and an entry in G_PROC_ARRAY are
000005C4  2               potentially modified )
000005C4  2                                                              *)
000005C4  2  BEGIN (* Procedure SET_PRI *)
000005C4  2    WITH G_PROC_ARRAY [ G_CUR_PROC ] DO
000005D6  2      BEGIN (* Assign new priority to current process *)
000005D6  2        PRI := LIMIT_PRI ( PRI );
000005E6  2        IF P_PRI < PRI
000005F6  2          THEN (* Need to check for higher priority task *)
000005F6  2            G_RUN_RUN := G_RUN_RUN + 1;
000005FA  2        P_PRI := PRI
00000606  2      END (* Assign new priority to current process *)
00000606  2  END; (* Procedure SET_PRI *)
00000000  1  $GLOBPROC OFF$
00000000  1
00000000  1
00000000  1
00000000  1
```

```
00000000 1
00000000 1  (*
00000000 1                          ********************
00000000 1                          ***** READ_PRI *****
00000000 1                          ********************
00000000 1                                                              *)
00000000 1  $GLOBPROC ON$
00000000 1  PROCEDURE READ_PRI ( VAR PRI:  S_INT );
0000060E 2  (*
0000060E 2    Global procedure READ_PRI to return the current process' priority.
0000060E 2
0000060E 2    Input:  none
0000060E 2    Output:  1) PRI, the priority of the current process
0000060E 2
0000060E 2  BEGIN (* Procedure READ_PRI *)
0000060E 2    PRI := G_PROC_ARRAY [ G_CUR_PROC ].P_PRI
00000628 2  END; (* Procedure READ_PRI *)
00000000 1  $GLOBPROC OFF$
00000000 1
00000000 1
00000000 1
00000000 1
00000000 1
00000000 1  (*
00000000 1                          *******************
00000000 1                          ***** SET_SIG *****
00000000 1                          *******************
00000000 1                                                              *)
00000000 1  $GLOBPROC ON$
00000000 1  PROCEDURE SET_SIG ( SIG:  L_INT );
00000630 2  (*
00000630 2    Global procedure SET_SIG to set a signal indicator in the current
00000630 2    process.
00000630 2
00000630 2    Input:  1) SIG, the signal to be set
00000630 2    Output:  none
00000630 2                                                              *)
00000630 2  BEGIN (* Procedure SET_SIG *)
00000630 2    G_PROC_ARRAY [ G_CUR_PROC ].P_SIG := SIG
00000644 2  END; (* Procedure SET_SIG *)
00000000 1  $GLOBPROC OFF$
00000000 1
00000000 1
00000000 1
00000000 1
00000000 1
00000000 1  (*
00000000 1                          ********************
00000000 1                          ***** READ_SIG *****
00000000 1                          ********************
00000000 1                                                              *)
00000000 1  $GLOBPROC ON$
00000000 1  PROCEDURE READ_SIG ( ID:  S_INT; VAR SIG:  L_INT );
00000000 2  (*
00000000 2    Global procedure READ_SIG to read the signal indicator of the given
00000000 2    process.  If the given process is a zombie, it is put out of its
00000000 2    misery and its entry in the process array is released.
00000000 2
00000000 2    READ_SIG uses the following procedure:  RELEASE.
00000000 2
00000000 2    Input:  1) ID, the process I.D. of the process whose signal is to
00000000 2               be read
00000000 2    Output:  1) SIG, the signal of the requested process ( 0 if no
00000000 2                signal )
00000000 2                                                              *)
00000000 2  VAR
00000000 2
00000000 2    INDEX:  S_INT; (* Index into process array *)
0000064C 2
0000064C 2  BEGIN (* Procedure READ_SIG *)
0000064C 2    SIG := 0;
00000652 2    INDEX := 0; (* Start at beginning of array *)
00000656 2    REPEAT (* Search process array for requested process *)
00000656 2      WITH G_PROC_ARRAY [ INDEX ] DO
```

```
00000668  2        IF P_ID = ID
00000674  2          THEN (* Found process *)
00000674  2            BEGIN (* Return signal *)
00000674  2              SIG := P_SIG;
0000067C  2              IF P_STAT = ZOMBIE
0000068C  2                THEN (* Release child process entry *)
0000068C  2                  RELEASE ( INDEX );
00000698  2              INDEX := G_TOP_PROC + 1
000006A2  2            END (* Return signal *)
000006A6  2          ELSE (* Did not find process *)
000006A6  2            INDEX := INDEX + 1
000006AA  2    UNTIL INDEX > G_TOP_PROC (* Until process is found or all active
000006B4  2                               processes have been searched *)
000006B4  2  END; (* Procedure READ_SIG *)
00000000  1  $GLOBPROC OFF$
00000000  1
00000000  1
00000000  1
00000000  1
00000000  1
00000000  1  (*
00000000  1                             *******************
00000000  1                             ***** READ_ID *****
00000000  1                             *******************
00000000  1                                                                *)
00000000  1  $GLOBPROC ON$
00000000  1  PROCEDURE READ_ID ( VAR ID:  S_INT );
000006BC  2  (*
000006BC  2    Global procedure READ_ID to return the current process' I.D.
000006BC  2
000006BC  2    Input:  none
000006BC  2    Output:  1) ID, the I.D. of the current process
000006BC  2                                                                *)
000006BC  2  BEGIN (* Procedure READ_ID *)
000006BC  2    ID := G_PROC_ARRAY [ G_CUR_PROC ].P_ID
000006D2  2  END; (* Procedure READ_ID *)
00000000  1  $GLOBPROC OFF$
00000000  1
00000000  1
00000000  1
00000000  1
00000000  1
00000000  1  (*
00000000  1                             ********************
00000000  1                             ***** READ_PID *****
00000000  1                             ********************
00000000  1                                                                *)
00000000  1  $GLOBPROC ON$
00000000  1  PROCEDURE READ_PID ( VAR PID:  S_INT );
000006DA  2  (*
000006DA  2    Global procedure READ_PID to return the current process' parent
000006DA  2    I.D.
000006DA  2
000006DA  2    Input:  none
000006DA  2    Output:  1) PID, the I.D. of the current process' parent process
000006DA  2                                                                *)
000006DA  2  BEGIN (* Procedure READ_PID *)
000006DA  2    PID := G_PROC_ARRAY [ G_CUR_PROC ].P_PID
000006F0  2  END; (* Procedure READ_PID *)
00000000  1  $GLOBPROC OFF$
00000000  1  .
```

End of compilation, number of errors=    0

```
"68000"
*
*  Tabs at 5, 15, 35
*
    EXTERNAL G_RUN_RUN, EXIT_
    EXTERNAL SWITCH, CLOCK, PANIC
*
    GLOBAL SAVE_USER, RESTORE_USER, CREATE_USER, FIND_NULL
    GLOBAL CLOCK_, CALL_
    GLOBAL PANIC_, PANIC_2, PANIC_3, PANIC_4, PANIC_5, PANIC_6
```

```
          GLOBAL PANIC_7, PANIC_8, PANIC_9, PANIC_10, PANIC_11, PANIC_24
          *
          ****************************** APROC_MGR ******************************
          *  APROC_MGR is the assembly language support module for the process
          *  manager of the Soda 68000 Operating System.  It contains all
          *  necessary low level routines for manipulation of supervisor/user
          *  stacks, as well as interrupt and trap handlers.
          *  Author:  Kip Fulghum
          *  Date:  5-10-82  Revised:  3-28-84
          ***********************************************************************
          *
          *  This module contains all routines used by the process manager for
          *  stack manipulation, interrupt, and trap handling.  These routines
          *  provide all the "guts" to the process manager.  The Pascal stuff
          *  is cake in comparison.
          *
          *  APROC_MGR contains the following routines:
          *  -Global procedure FIND_NULL searches through the linked A6 registers
          *   on the supervisor stack until the null link is found.
          *  -Global procedure SAVE_USER moves the current user process context
          *   from the supervisor stack to the current user stack.
          *  -Global procedure RESTORE_USER moves the given user process
          *   context from the given user stack to the supervisor stack.
          *  -Global procedure CREATE_USER initializes the given user stack
          *   to prepare it for run status and a context switch.
          *  -Procedure EXCEPT_HANDLER handles all interrupts and traps after
          *   some "pre-processing."
          *  -Trap handler CALL_ is the system call trap "pre-processor" prior
          *   to entry to the exception handler.
          *  -Interrupt handler CLOCK_ is the clock interrupt "pre-processor"
          *   prior to entry to the exception handler.
          *  -Trap handlers PANIC_XX are the error trap "pre-processors" for each
          *   type of error prior to entry to the exception handler.
          *
          *  In addition, the following external routines are used:  SWITCH,
          *  CLOCK, and PANIC.
          *
          ***********************************************************************
          ************************** BPC Dependent Code *************************
          ***********************************************************************
          *
          *  -Interrupt handler BPC_ is the BPC interrupt "pre-processor"
          *   prior to entry to the exception handler.
          *  -Procedure BPC wakes up all processes waiting on a BPC interrupt.
          *
          *  In addition, the following external routine is used:  WAKEUP.
          *





          *                         **********************
          *                         ***** FIND_NULL *****
          *                         **********************
          *
          *  Procedure FIND_NULL to search through the linked A6 registers on the
          *  the supervisor stack until the null link is found.
          *
          *  Input:  none
          *  Output:  1) address of null link, in A1 register
          *
000000    FIND_NULL
          *  BEGIN  < Procedure FIND_NULL
000000 200E    MOVE.L   A6,D0                ; Get local frame pointer.
000002    FIND_LOOP
000002 2240    MOVEA.L  D0,A1                ; Move to next pointer.
000004 2011    MOVE.L   (A1),D0              ; Search back through local frame...
000006 66FA    BNE.S    FIND_LOOP            ; pointers to find current context.
          *                                  ; Register A1 now contains adrs...
000008 4E75    RTS                           ; of null link.
          *  END    < Procedure FIND_NULL
```

```
                      *                     *********************
                      *                     ***** SAVE_USER *****
                      *                     *********************
                      *
                      *  Procedure SAVE_USER to save the current user context on the current
                      *  user stack from the supervisor stack.  Upon entry, SAVE_USER assumes
                      *  the current supervisor stack looks like the following:
                      *
                      *          Supervisor Stack
                      *          ----------------
                      *       |         .          |
                      *       |         .          |
                      *       |         .          |
                      *       |--------------------|
                      *       |  Cur. user PC      |
                      *       |--------------------|
                      *       |  Cur. user SR      |
                      *       |--------------------|
                      *       | .  Registers     . |
                      *       | .   A6-A0,       . |
                      *       | .   D7-D0        . |
                      *       |--------------------|
                      *     ->|         0          |
                      *     | |--------------------|
                      *     | |         .          |
                      *     --|         .          |
                      *     ->|         .          |
                      *     | |         .          |
                      *     | |--------------------|
                      *     --|     prev. A6       | <-- Top of supervisor stack ( grows
                      *       |--------------------|     downward )
                      *       |         v          |
                      *
                      *  SAVE_USER searches through the linked A6 registers on the supervisor
                      *  stack until it finds the null link.  It then moves the next 33 words
                      *  ( 16 bit ) prior to the null link from the supervisor stack onto
                      *  the current user stack.  The supervisor stack pointer is not affected
                      *  and the new "top" to the user stack is returned to the caller.  The
                      *  user stack is left ready for a RESTORE_USER.
                      *
                      *  SAVE_USER uses the following procedure:  FIND_NULL.
                      *
                      *  Declaration:
                      *
                      *  PROCEDURE SAVE_USER ( VAR UPTR:  L_INT ); EXTERNAL;
                      *
                      *  Input:  none
                      *  Output:  1) UPTR, the address of the new top to the current user's
                      *              stack
                      *
00000A                SAVE_USER
                      * BEGIN  < Procedure SAVE_USER
00000A 61F4               BSR       FIND_NULL        ; Get address of null link...
                      *                              ; ( returned in register A1 ).
00000C 5889               ADDQ.L    #4,A1            ; Move ptr to first word to be...
                      *                              ; saved ( add in 4 bytes for null...
                      *                              ; link ).
00000E 4E6A               MOVE      USP,A2           ; Get user stack pointer.
000010 303C 0020          MOVE.W    #32,D0           ; Get ready to move 33 words...
000014                SAVE_LOOP                      ; ( 16 bit ):  DBcc instruction...
                      *                              ; counts to -1, so set counter to 32.
000014 3519               MOVE.W    (A1)+,-(A2)      ; Move a word.
000016 51C8 FFFC          DBF       D0,SAVE_LOOP     ; Repeat if not done.
                      *
00001A 206F 0004          MOVEA.L   4(A7),A0         ; Get adrs of param off stack.
00001E 208A               MOVE.L    A2,(A0)          ; Return top of user stack to caller.
000020 4E75               RTS
                      * END    < Procedure SAVE_USER
```

```
                     *                    ************************
                     *                    ***** RESTORE_USER *****
                     *                    ************************
                     *
                     *  Procedure RESTORE_USER to restore the given user context on the
                     *  given user stack to the supervisor stack.  Upon entry, RESTORE_USER
                     *  assumes the given user stack looks like the following:
                     *
                     *          Given User Sack
                     *        -------------------
                     *       |         .         |
                     *       |         .         |
                     *       |         .         |
                     *       |-------------------|
                     *       |  .  Registers   . |
                     *       |  .    D0-D7,    . |
                     *       |  .    A0-A6     . |
                     *       |-------------------|
                     *       |   Cur. user SR    |
                     *       |-------------------|
                     *       |   Cur. user PC    | <-- Top of given user stack
                     *       |-------------------|
                     *       |         .         |
                     *       |         .         |
                     *       |         .         |
                     *       |         v         |
                     *
                     *  RESTORE_USER searches through the linked A6 registers on the
                     *  supervisor stack until it finds the null link.  It then moves the
                     *  next 33 words ( 16 bit ) from the given user stack onto the
                     *  supervisor stack 33 words prior to the null link.  The supervisor
                     *  stack pointer is not affected.
                     *
                     *  RESTORE_USER uses the following procedure:  FIND_NULL.
                     *
                     *  Declaration:
                     *
                     *  PROCEDURE RESTORE_USER ( UPTR:  L_INT ); EXTERNAL;
                     *
                     *  Input:  1) UPTR, the address of the top to the given user's
                     *             stack
                     *  Output:  none
                     *
000022               RESTORE_USER
                     * BEGIN  < Procedure RESTORE_USER
000022 61DC              BSR       FIND_NULL           ; Get address of null link...
                     *                                 ; ( returned in register A1 ).
000024 D3FC              ADD.L     #70,A1              ; Move ptr to 1 past 1st location...
                     *                                 ; to be restored ( 4 bytes for null...
                     *                                 ; link, 66 data bytes ).
00002A 246F 0004         MOVEA.L   4(A7),A2            ; Get address of top of user stack.
00002E 303C 0020         MOVE.W    #32,D0              ; Get ready to move 33 words...
000032               RESTORE_LOOP                      ; ( 16 bit ):  DBcc instruction...
                     *                                 ; counts to -1, so set counter to 32.
000032 331A              MOVE.W    (A2)+,-(A1)         ; Move a word.
000034 51C8 FFFC         DBF       D0,RESTORE_LOOP     ; Repeat if not done.
                     *
000038 4E62              MOVE      A2,USP              ; Restore user stack pointer.
00003A 4E75              RTS
                     * END    < Procedure RESTORE_USER




                     *                    ************************
                     *                    ***** CREATE_USER *****
                     *                    ************************
                     *
                     *  Procedure CREATE_USER to initialize the given user stack to prepare
                     *  it for run status and a context switch.  CREATE_USER makes the
                     *  user stack look like a SAVE_USER had been previously executed
```

```
                 *  so it is ready for a RESTORE_USER.
                 *
                 *  CREATE_USER pushes the entry address for EXIT_ onto the given user
                 *  stack, zeros for registers D0-D7, A0-A6 and the user SR, then the
                 *  given entry address.  The new "top" to the new user stack is then
                 *  returned to the caller.
                 *
                 *  Declaration:
                 *
                 *  PROCEDURE CREATE_USER ( ADDR:  L_INT; VAR STACK:  L_INT ); EXTERNAL;
                 *
                 *  Input:  1) ADDR, the entry address for the new process
                 *          2) STACK, the address of the new process' stack ( ie
                 *             its top )
                 *  Output:  1) STACK, the top of the new process' stack after the
                 *              necessary items have been pushed on
                 *
00003C           CREATE_USER
                 * BEGIN  < Procedure CREATE_USER
00003C 206F 0004    MOVEA.L   4[A7],A0          ; Get adrs of param off stack...
                                                ; ( save adrs of param in A0 ).
000040 2450         MOVEA.L   [A0],A2           ; Get address of top of user stack.
000042 253C         MOVE.L    #EXIT_,-[A2]      ; Push EXIT_ address onto user stack.
000048 303C 001E    MOVE.W    #30,D0            ; Get ready to zero all registers...
00004C           CREATE_LOOP                    ; ( D0-D7, A0-A6, SR ):  DBcc instr...
                 *                              ; counts to -1, so set counter to 30.
00004C 353C 0000    MOVE.W    #0,-[A2]          ; Zero a register location on stack.
000050 51C8 FFFA    DBF       D0,CREATE_LOOP    ; Repeat if not done.
                 *
000054 352F 0008    MOVE.W    8[A7],-[A2]       ; Push entry address onto...
000058 352F 000A    MOVE.W    10[A7],-[A2]      ; user stack one word at a time!
                 *                              ; ( push MSW first! ).
00005C 208A         MOVE.L    A2,[A0]           ; Return top of user stack to caller.
00005E 4E75         RTS
                 * END    < Procedure CREATE_USER





                 *                        ***************************
                 *                        ***** EXCEPT_HANDLER *****
                 *                        ***************************
                 *
                 *  The exception handler, EXCEPT_HANDLER, handles all interrupts and
                 *  traps after some pre-processing by the immediate interrupt/trap
                 *  routine ( ie CLOCK_, CALL_, PANIC_, etc ).  Upon entry, it
                 *  assumes that registers A6-A0, D7-D0 have been saved on the
                 *  supervisor stack ( in that order ) and that the first LINK A6
                 *  has been performed.
                 *
                 *  EXCEPT_HANDLER should be entered via a JMP or BRA ( no return ).
                 *  The routine sets up the system data area via A5, then executes the
                 *  given exception routine.  After return, the previous processor
                 *  priority level and the global flag G_RUN_RUN are checked.  If
                 *  the priority was 0 and the flag is set, SWITCH is called.  Otherwise,
                 *  a return from exception is executed ( which may return to the
                 *  interrupted routine, or may not, depending on whether SWITCH was
                 *  called ).
                 *
                 *  EXCEPT_HANDLER uses the following procedures and functions:  SWITCH,
                 *  FIND_NULL, and whatever routine is passed in register A0.
                 *
                 *  Input:  1) address of interrupt/trap routine to be executed, in
                 *             register A0
                 *  Output:  none
                 *
000060           EXCEPT_HANDLER
                 *  BEGIN  < EXCEPT_HANDLER
000060 2A7C         MOVE.L    #0,A5             ; Set static data offset to 0.
000066 4E90         JSR       [A0]              ; Enter interrupt/trap routine.
000068 6196         BSR       FIND_NULL         ; Get address of null link...
                 *                              ; ( returned in register A1 ).
```

```
00006A D3FC             ADD.L    #64,A1              ; Move ptr to current user SR on...
                *                                    ; supervisor stack ( 4 bytes for...
                *                                    ; null link, 60 data bytes ).
000070 3011             MOVE.W   (A1),D0             ; Get current user processor priority.
000072 0240 0700        ANDI.W   #0700H,D0           ; Mask off all but priority.
000076 660A             BNE.S    NO_SWITCH           ; If not 0, don't allow context...
                *                                    ; switch.
000078 302D 0000        MOVE.W   G_RUN_RUN(A5),D0    ; Check for higher priority task.
00007C 6704             BEQ.S    NO_SWITCH           ; Nope.
00007E 4EBA 0000        JSR      SWITCH(PC)          ; Yup.
000082          NO_SWITCH
000082 4E5E             UNLK     A6                  ; Pop off null link.
                *  Restore all registers from supervisor stack.
000084 4CDF 7FFF        MOVEM.L  (A7)+,D0/D1/D2/D3/D4/D5/D6/D7/A0/A1/A2/A3/A4/A5/A6
                *
000088 4E73             RTE                          ; Return from interrupt or trap.
                *  END    < EXCEPT_HANDLER





                *                         ******************
                *                         ***** CALL_ *****
                *                         ******************
                *
                *  CALL_ is the system call trap "pre-processor" prior to entry to the
                *  exception handler.  It saves registers A6-A0, D7-D0 on the
                *  supervisor stack, does the initial LINK A6, pulls the address of the
                *  appropriate system routine off the user stack, transfers all
                *  necessary parameters for that routine off the user stack onto the
                *  system stack, then returns the address of the system routine to
                *  the exception handler.
                *
                *  Input:  none
                *  Output:  1) address of appropriate system routine, in register A0.
                *
00008A          CALL_
                *  BEGIN  < Trap procedure CALL_
00008A 007C 0600        ORI.W    #600H,SR            ; Raise processor priority to...
                *                                    ; prevent interrupts.
                *  Save all registers onto supervisor stack.
00008E 48E7 FFFE        MOVEM.L  A6/A5/A4/A3/A2/A1/A0/D7/D6/D5/D4/D3/D2/D1/D0,-(A7)
                *
000092 2C7C             MOVE.L   #0,A6               ; Start linking A6...
000098 4E56 0000        LINK     A6,#0               ; registers.
00009C 4E6A             MOVE     USP,A2              ; Get user stack pointer.
00009E 4280             CLR.L    D0
0000A0 301A             MOVE.W   (A2)+,D0            ; Pull params # 16 bit words off...
                *                                    ; user stack.
0000A2 205A             MOVEA.L  (A2)+,A0            ; Pull adrs of sys routine off stack.
0000A4 670C             BEQ.S    C_DONE              ; Skip param loop if no params.
0000A6 588A             ADDQ.L   #4,A2               ; Jump over ret adrs.
0000A8 E380             ASL.L    #1,D0               ; Change word count to byte count.
0000AA D5C0             ADD.L    D0,A2               ; Goto beginning of params.
0000AC          C_LOOP
0000AC 3F22             MOVE.W   -(A2),-(A7)         ; Move a 16 bit word ( 2 bytes ).
0000AE 5540             SUBQ.W   #2,D0
0000B0 66FA             BNE.S    C_LOOP              ; Repeat.
0000B2          C_DONE
0000B2 60AC             BRA      EXCEPT_HANDLER      ; Goto exception handler ( adrs...
                *                                    ; of routine in A0 ).
                *  END    < Trap procedure CALL_





                *                         ******************
                *                         ***** CLOCK_ *****
                *                         ******************
                *
                *  CLOCK_ is the clock interrupt "pre-processor" prior to entry
                *  to the exception handler.  It saves registers A6-A0, D7-D0 on the
```

```
                    * supervisor stack, does the initial LINK A6, then returns the address
                    * of the clock interrupt routine to the exception handler.
                    *
                    * Input:  none
                    * Output:  1) address of CLOCK system routine, in register A0.
                    *
0000B4              CLOCK_
                    * BEGIN  < Interrupt procedure CLOCK_
0000B4 007C 0600         ORI.W      #600H,SR              ; Raise processor priority to...
                    *                                     ; prevent interrupts.
                    *  Save all registers onto supervisor stack.
0000B8 48E7 FFFE         MOVEM.L    A6/A5/A4/A3/A2/A1/A0/D7/D6/D5/D4/D3/D2/D1/D0,-[A7]
                    *
0000BC 2C7C              MOVE.L     #0,A6                 ; Start linking A6...
0000C2 4E56 0000         LINK       A6,#0                 ; registers.
0000C6 23EF 0042         MOVE.L     66[A7],CLR_DELTA_TIME   ; Clear delta time interrupt...
                                                          ; with current user PC.
0000CE 41FA 0000         LEA        CLOCK[PC],A0          ; Pass address of CLOCK to...
0000D2 608C              BRA        EXCEPT_HANDLER        ; exception handler in A0.
                    * END   < Interrupt procedure CLOCK_
                    *
    <00600000>      CLR_DELTA_TIME EQU 600000H            ; Location to write to to clear...
                    *                                     ; delta time.





                    *                     ******************
                    *                     ***** PANIC_ *****
                    *                     ******************
                    *
                    * PANIC_XX are the error trap "pre-processors" for each type of error
                    * prior to entry to the exception handler.  They all save registers
                    * registers A6-A0, D7-D0 on the supervisor stack, do the initial
                    * LINK A6, push a unique trap panic indicator on the stack, then
                    * return the address of the panic routine to the exception handler.
                    *
                    * Input:  none
                    * Output:  1) address of PANIC error routine, in register A0.
                    *
0000D4              PANIC_
                    * BEGIN  < Trap procedure PANIC_
0000D4 007C 0600         ORI.W      #600H,SR              ; Raise processor priority to...
                    *                                     ; prevent interrupts.
                    *  Save all registers onto supervisor stack.
0000D8 48E7 FFFE         MOVEM.L    A6/A5/A4/A3/A2/A1/A0/D7/D6/D5/D4/D3/D2/D1/D0,-[A7]
                    *
0000DC 2C7C              MOVE.L     #0,A6                 ; Start linking A6...
0000E2 4E56 0000         LINK       A6,#0                 ; registers.
0000E6 2F3C              MOVE.L     #0,-[A7]              ; Push PANIC's trap param onto stack.
0000EC 41FA 0000         LEA        PANIC[PC],A0          ; Pass address of PANIC.
0000F0 6000 FF6E         BRA        EXCEPT_HANDLER        ; Goto exception handler ( adrs...
                    *                                     ; of routine in A0 ).
                    * END   < Trap procedure PANIC_

0000F4              PANIC_2
                    * BEGIN  < Trap procedure PANIC_2
0000F4 007C 0600         ORI.W      #600H,SR              ; Raise processor priority to...
                    *                                     ; prevent interrupts.
                    *  Save all registers onto supervisor stack.
0000F8 48E7 FFFE         MOVEM.L    A6/A5/A4/A3/A2/A1/A0/D7/D6/D5/D4/D3/D2/D1/D0,-[A7]
                    *
0000FC 2C7C              MOVE.L     #0,A6                 ; Start linking A6...
000102 4E56 0000         LINK       A6,#0                 ; registers.
000106 2F3C              MOVE.L     #2,-[A7]              ; Push PANIC's trap param onto stack.
00010C 41FA 0000         LEA        PANIC[PC],A0          ; Pass address of PANIC.
000110 6000 FF4E         BRA        EXCEPT_HANDLER        ; Goto exception handler ( adrs...
                    *                                     ; of routine in A0 ).
                    * END   < Trap procedure PANIC_2

000114              PANIC_3
                    * BEGIN  < Trap procedure PANIC_3
000114 007C 0600         ORI.W      #600H,SR              ; Raise processor priority to...
                    *                                     ; prevent interrupts.
```

```
                 *   Save all registers onto supervisor stack.
000118 48E7 FFFE        MOVEM.L   A6/A5/A4/A3/A2/A1/A0/D7/D6/D5/D4/D3/D2/D1/D0,-[A7]
                 *
00011C 2C7C             MOVE.L    #0,A6               ; Start linking A6...
000122 4E56 0000        LINK      A6,#0               ; registers.
000126 2F3C             MOVE.L    #3,-[A7]            ; Push PANIC's trap param onto stack.
00012C 41FA 0000        LEA       PANIC[PC],A0        ; Pass address of PANIC.
000130 6000 FF2E        BRA       EXCEPT_HANDLER      ; Goto exception handler ( adrs...
                 *                                    ; of routine in A0 ).
                 *  END    < Trap procedure PANIC_3

000134           PANIC_4
                 *  BEGIN  < Trap procedure PANIC_4
000134 007C 0600        ORI.W     #600H,SR            ; Raise processor priority to...
                 *                                    ; prevent interrupts.
                 *   Save all registers onto supervisor stack.
000138 48E7 FFFE        MOVEM.L   A6/A5/A4/A3/A2/A1/A0/D7/D6/D5/D4/D3/D2/D1/D0,-[A7]
                 *
00013C 2C7C             MOVE.L    #0,A6               ; Start linking A6...
000142 4E56 0000        LINK      A6,#0               ; registers.
000146 2F3C             MOVE.L    #4,-[A7]            ; Push PANIC's trap param onto stack.
00014C 41FA 0000        LEA       PANIC[PC],A0        ; Pass address of PANIC.
000150 6000 FF0E        BRA       EXCEPT_HANDLER      ; Goto exception handler ( adrs...
                 *                                    ; of routine in A0 ).
                 *  END    < Trap procedure PANIC_4

000154           PANIC_5
                 *  BEGIN  < Trap procedure PANIC_5
000154 007C 0600        ORI.W     #600H,SR            ; Raise processor priority to...
                 *                                    ; prevent interrupts.
                 *   Save all registers onto supervisor stack.
000158 48E7 FFFE        MOVEM.L   A6/A5/A4/A3/A2/A1/A0/D7/D6/D5/D4/D3/D2/D1/D0,-[A7]
                 *
00015C 2C7C             MOVE.L    #0,A6               ; Start linking A6...
000162 4E56 0000        LINK      A6,#0               ; registers.
000166 2F3C             MOVE.L    #5,-[A7]            ; Push PANIC's trap param onto stack.
00016C 41FA 0000        LEA       PANIC[PC],A0        ; Pass address of PANIC.
000170 6000 FEEE        BRA       EXCEPT_HANDLER      ; Goto exception handler ( adrs...
                 *                                    ; of routine in A0 ).
                 *  END    < Trap procedure PANIC_5

000174           PANIC_6
                 *  BEGIN  < Trap procedure PANIC_6
000174 007C 0600        ORI.W     #600H,SR            ; Raise processor priority to...
                 *                                    ; prevent interrupts.
                 *   Save all registers onto supervisor stack.
000178 48E7 FFFE        MOVEM.L   A6/A5/A4/A3/A2/A1/A0/D7/D6/D5/D4/D3/D2/D1/D0,-[A7]
                 *
00017C 2C7C             MOVE.L    #0,A6               ; Start linking A6...
000182 4E56 0000        LINK      A6,#0               ; registers.
000186 2F3C             MOVE.L    #6,-[A7]            ; Push PANIC's trap param onto stack.
00018C 41FA 0000        LEA       PANIC[PC],A0        ; Pass address of PANIC.
000190 6000 FECE        BRA       EXCEPT_HANDLER      ; Goto exception handler ( adrs...
                 *                                    ; of routine in A0 ).
                 *  END    < Trap procedure PANIC_6

000194           PANIC_7
                 *  BEGIN  < Trap procedure PANIC_7
000194 007C 0600        ORI.W     #600H,SR            ; Raise processor priority to...
                 *                                    ; prevent interrupts.
                 *   Save all registers onto supervisor stack.
000198 48E7 FFFE        MOVEM.L   A6/A5/A4/A3/A2/A1/A0/D7/D6/D5/D4/D3/D2/D1/D0,-[A7]
                 *
00019C 2C7C             MOVE.L    #0,A6               ; Start linking A6...
0001A2 4E56 0000        LINK      A6,#0               ; registers.
0001A6 2F3C             MOVE.L    #7,-[A7]            ; Push PANIC's trap param onto stack.
0001AC 41FA 0000        LEA       PANIC[PC],A0        ; Pass address of PANIC.
0001B0 6000 FEAE        BRA       EXCEPT_HANDLER      ; Goto exception handler ( adrs...
                 *                                    ; of routine in A0 ).
                 *  END    < Trap procedure PANIC_7

0001B4           PANIC_8
                 *  BEGIN  < Trap procedure PANIC_8
0001B4 007C 0600        ORI.W     #600H,SR            ; Raise processor priority to...
```

```
                    *                                          ; prevent interrupts.
                    *    Save all registers onto supervisor stack.
0001B8 48E7 FFFE         MOVEM.L   A6/A5/A4/A3/A2/A1/A0/D7/D6/D5/D4/D3/D2/D1/D0,-[A7]
                    *
0001BC 2C7C              MOVE.L    #0,A6                  ; Start linking A6...
0001C2 4E56 0000         LINK      A6,#0                  ; registers.
0001C6 2F3C              MOVE.L    #8,-[A7]               ; Push PANIC's trap param onto stack.
0001CC 41FA 0000         LEA       PANIC[PC],A0           ; Pass address of PANIC.
0001D0 6000 FE8E         BRA       EXCEPT_HANDLER         ; Goto exception handler ( adrs...
                    *                                      ; of routine in A0 ).
                    *    END    < Trap procedure PANIC_8

0001D4              PANIC_9
                    *    BEGIN  < Trap procedure PANIC_9
0001D4 007C 0600         ORI.W     #600H,SR               ; Raise processor priority to...
                    *                                      ; prevent interrupts.
                    *    Save all registers onto supervisor stack.
0001D8 48E7 FFFE         MOVEM.L   A6/A5/A4/A3/A2/A1/A0/D7/D6/D5/D4/D3/D2/D1/D0,-[A7]
                    *
0001DC 2C7C              MOVE.L    #0,A6                  ; Start linking A6...
0001E2 4E56 0000         LINK      A6,#0                  ; registers.
0001E6 2F3C              MOVE.L    #9,-[A7]               ; Push PANIC's trap param onto stack.
0001EC 41FA 0000         LEA       PANIC[PC],A0           ; Pass address of PANIC.
0001F0 6000 FE6E         BRA       EXCEPT_HANDLER         ; Goto exception handler ( adrs...
                    *                                      ; of routine in A0 ).
                    *    END    < Trap procedure PANIC_9

0001F4              PANIC_10
                    *    BEGIN  < Trap procedure PANIC_10
0001F4 007C 0600         ORI.W     #600H,SR               ; Raise processor priority to...
                    *                                      ; prevent interrupts.
                    *    Save all registers onto supervisor stack.
0001F8 48E7 FFFE         MOVEM.L   A6/A5/A4/A3/A2/A1/A0/D7/D6/D5/D4/D3/D2/D1/D0,-[A7]
                    *
0001FC 2C7C              MOVE.L    #0,A6                  ; Start linking A6...
000202 4E56 0000         LINK      A6,#0                  ; registers.
000206 2F3C              MOVE.L    #10,-[A7]              ; Push PANIC's trap param onto stack.
00020C 41FA 0000         LEA       PANIC[PC],A0           ; Pass address of PANIC.
000210 6000 FE4E         BRA       EXCEPT_HANDLER         ; Goto exception handler ( adrs...
                    *                                      ; of routine in A0 ).
                    *    END    < Trap procedure PANIC_10

000214              PANIC_11
                    *    BEGIN  < Trap procedure PANIC_11
000214 007C 0600         ORI.W     #600H,SR               ; Raise processor priority to...
                    *                                      ; prevent interrupts.
                    *    Save all registers onto supervisor stack.
000218 48E7 FFFE         MOVEM.L   A6/A5/A4/A3/A2/A1/A0/D7/D6/D5/D4/D3/D2/D1/D0,-[A7]
                    *
00021C 2C7C              MOVE.L    #0,A6                  ; Start linking A6...
000222 4E56 0000         LINK      A6,#0                  ; registers.
000226 2F3C              MOVE.L    #11,-[A7]              ; Push PANIC's trap param onto stack.
00022C 41FA 0000         LEA       PANIC[PC],A0           ; Pass address of PANIC.
000230 6000 FE2E         BRA       EXCEPT_HANDLER         ; Goto exception handler ( adrs...
                    *                                      ; of routine in A0 ).
                    *    END    < Trap procedure PANIC_11

000234              PANIC_24
                    *    BEGIN  < Trap procedure PANIC_24
000234 007C 0600         ORI.W     #600H,SR               ; Raise processor priority to...
                    *                                      ; prevent interrupts.
                    *    Save all registers onto supervisor stack.
000238 48E7 FFFE         MOVEM.L   A6/A5/A4/A3/A2/A1/A0/D7/D6/D5/D4/D3/D2/D1/D0,-[A7]
                    *
00023C 2C7C              MOVE.L    #0,A6                  ; Start linking A6...
000242 4E56 0000         LINK      A6,#0                  ; registers.
000246 2F3C              MOVE.L    #24,-[A7]              ; Push PANIC's trap param onto stack.
00024C 41FA 0000         LEA       PANIC[PC],A0           ; Pass address of PANIC.
000250 6000 FE0E         BRA       EXCEPT_HANDLER         ; Goto exception handler ( adrs...
                    *                                      ; of routine in A0 ).
                    *    END    < Trap procedure PANIC_24
```

```
*******************************************************************************
**************************** BPC Dependent Code *****************************
*******************************************************************************


                           EXTERNAL WAKEUP
                           EXTERNAL BPC_HANDSHAKE
                       *
                           GLOBAL BPC_
                       *                            ****************
                       *                            ***** BPC_ *****
                       *                            ****************
                       *
                       *  BPC_ is the BPC interrupt "pre-processor" prior to entry to the
                       *  exception handler.  It saves registers A6-A0, D7-D0 on the
                       *  supervisor stack, does the initial LINK A6, then returns the address
                       *  of the BPC interrupt routine to the exception handler.
                       *
                       *  Input:  none
                       *  Output:  1) address of BPC system routine, in register A0.
                       *
000254                 BPC_
                       *  BEGIN  < Interrupt procedure BPC_
000254 007C 0600           ORI.W     #600H,SR              ; Raise processor priority to...
                       *                                   ; prevent interrupts.
                       *   Save all registers onto supervisor stack.
000258 48E7 FFFE           MOVEM.L   A6/A5/A4/A3/A2/A1/A0/D7/D6/D5/D4/D3/D2/D1/D0,-[A7]
                       *
00025C 2C7C                MOVE.L    #0,A6                 ; Start linking A6...
000262 4E56 0000           LINK      A6,#0                 ; registers.
000266 41FA 0006           LEA       BPC[PC],A0            ; Pass address of BPC to...
00026A 6000 FDF4           BRA       EXCEPT_HANDLER        ; exception handler in A0.
                       *  END    < Interrupt procedure BPC_





                       *                            ****************
                       *                            ***** BPC *****
                       *                            ****************
                       *
                       *  Procedure BPC to wake up all processes waiting on a BPC interrupt.
                       *  The channel number to wake up is taken from the BPC handshake flag.
                       *
                       *  BPC uses the following procedure:  WAKEUP.
                       *
                       *  Input:  none
                       *  Output:  none
                       *
00026E                 BPC
                       *  BEGIN  < Procedure BPC
00026E 4E56 0000           LINK      A6,#0
000272 2B7C                MOVE.L    #2,BPC_HANDSHAKE[A5]     ; Set BPC acknowledge flag.
00027A                 BPC_WAIT
00027A 202D 0000           MOVE.L    BPC_HANDSHAKE[A5],D0
00027E 0C40 0002           CMPI.W    #2,D0
000282 67F6                BEQ.S     BPC_WAIT              ; Wait for BPC to clear interrupt.
                       *
000284 2F2D 0000           MOVE.L    BPC_HANDSHAKE[A5],-[A7]  ; Wake up everybody waiting...
000288 4EBA 0000           JSR       WAKEUP[PC]               ; on the BPC for this channel.
00028C 588F                ADDQ.L    #4,A7
00028E 42AD 0000           CLR.L     BPC_HANDSHAKE[A5]     ; Reset the handshake flag.
000292 4E5E                UNLK      A6
000294 4E75                RTS
                       *  END    < Procedure BPC
                           END

Errors=    0
```

```
                 "68000"
                 *
                 *   Tabs at 5, 15, 35
                 *
                     EXTERNAL FIND_NULL
                     EXTERNAL G_CUR_PROC
                     EXTERNAL PANIC_HANDSHAKE
                     GLOBAL PANIC
                 *
                 ********************************* PANIC *********************************
                 * PANIC is the panic routine for the process manager of the Soda
                 * 68000 Operating System.  It handles all catastrophic, non-recoverable
                 * errors.  It transfers the input parameter, then hangs forever with
                 * processor priority high enough to prevent interrupts.
                 * Author:  Kip Fulghum
                 * Date:  5-18-82  Revised:  4-5-83
                 *************************************************************************
                 *
                 * PANIC uses the following external routine:  FIND_NULL.
                 *
                 * Declaration:
                 *
                 * PROCEDURE PANIC ( CODE:  PANIC_TYPE ); EXTERNAL;
                 *
                 * Input:  1), CODE, an identifier of the calling routine
                 * Output:  none
                 *
000000           PANIC
                 * BEGIN  < Procedure PANIC
000000 007C 0600     ORI      #600H,SR             ; Raise processor priority.
000004           STOP
                 *
                 *   Get panic code and current user
                 *
000004 202F 0004     MOVE.L   4(A7),D0             ; Get panic code so analyzer can see.
000008 0240 00FF     ANDI.W   #00FFH,D0            ; Mask off upper byte.
00000C 322D 0000     MOVE.W   G_CUR_PROC(A5),D1    ; Get current user.
000010 E149          LSL.W    #8,D1                ; Move to upper byte ( clears lower ).
000012 8240          OR.W     D0,D1                ; Put the bytes together.
000014 3B41 0000     MOVE.W   D1,PANIC_HANDSHAKE(A5)   ; Let the BPC know what's...
                 *
000018 4E71          NOP                               ; happening.
00001A 4E71          NOP
                 *
                 *   Get all user registers ( reg. D0-D7, A0-A6, SR, PC ).
                 *
00001C 4EBA 0000     JSR      FIND_NULL(PC)        ; Find botton of supervisor stack.
                 *                                 ; ( address returned in A1 register ).
000020 5889          ADDQ.L   #4,A1                ; Move past null link.
000022 303C 0020     MOVE.W   #32,D0               ; Set count to 32 to move 33 words...
                 *                                 ; because DBcc decr. to -1.
000026           REG_LOOP                          ; Move user reg. D0-D7, A0-A6, SR,...
000026 3219          MOVE.W   (A1)+,D1             ; PC one word at a time ( MSW...
                 *                                 ; is in lower address ).
000028 51C8 FFFC     DBF      D0,REG_LOOP          ; Repeat if not done.
                 *
00002C 4E71          NOP
00002E 4E71          NOP
                 *
                 *   Get top 20 words off current user stack.
                 *
000030 4E6A          MOVE     USP,A2               ; Get current user stack pointer.
000032 303C 0013     MOVE.W   #19,D0               ; Move top 20 words off user stack...
000036           USER_STACK_LOOP                   ; ( DBcc decr. to -1, so set...
000036 321A          MOVE.W   (A2)+,D1             ; counter to 19 ).
000038 51C8 FFFC     DBF      D0,USER_STACK_LOOP   ; Repeat if not done.
                 *
00003C 4E71          NOP
00003E 4E71          NOP
                 *
000040 264F          MOVE.L   A7,A3                ; Get current system stack pointer.
000042 303C 0013     MOVE.W   #19,D0               ; Move top 20 words off system...
000046           SYS_STACK_LOOP                    ; stack ( DBcc decr. to -1, so set...
000046 321B          MOVE.W   (A3)+,D1             ; counter to 19 ).
```

```
000048 51C8 FFFC        DBF       D0,SVS_STACK_LOOP   ; Repeat if not done.
                  *
00004C 4E71             NOP
00004E 4E71             NOP
                  *
000050 60B2             BRA.S     STOP                ; Hang.
                  *  END   < Procedure PANIC
                        END

Errors=    0
                  "68000"
                  *
                  *  Tabs at 5, 15, 35
                  *
                       EXTERNAL PROC_INIT, CALL_, CLOCK_, BPC_
                       EXTERNAL PANIC_, PANIC_2, PANIC_3, PANIC_4, PANIC_5, PANIC_6
                       EXTERNAL PANIC_7, PANIC_8, PANIC_9, PANIC_10, PANIC_11, PANIC_24
                  *
                       GLOBAL APROC_INIT, INIT_STACK
                       GLOBAL BPC_HANDSHAKE, PANIC_HANDSHAKE
                  *
                  ****************************** APROC_INIT ******************************
                  *  APROC_INIT is the assembly language support module for the
                  *  initialization of the process manager of the Soda 68000 Operating
                  *  System.  It contains the low level initialization routine necessary
                  *  to get things underway.
                  *  Author:  Kip Fulghum
                  *  Date:  5-24-82  Revised:  5-25-83
                  ************************************************************************
                  *
                  *  This module is the entry point into the Soda 68000 Operating System
                  *  process manager.  It sets up the supervisor stack, sets up the
                  *  location for the initial user stack, then transfers control to the
                  *  process manager, which initializes all of its structures ( the
                  *  process array, etc. ) and process 0.  The exception table is
                  *  also included in this module, as is the definition of the supervisor
                  *  stack.
                  *
000000            APROC_INIT
                  *  BEGIN  < APROC_INIT
000000 007C 0600       ORI.W      #600H,SR            ; Raise processor priority to...
                  *                                   ; prevent interrupts.
000004 23FC            MOVE.L     #APROC_INIT,RESET_ADRS   ; Restore reset vector.
00000E 2A7C            MOVE.L     #0,A5               ; Initialize static data pointer.
000014 2E7C            MOVEA.L    #SUPER_STACK,A7     ; Initialize the supervisor stack.
00001A 207C            MOVEA.L    #INIT_STACK,A0
000020 4E60            MOVE       A0,USP              ; Set up first user stack ( garbage ).
000022 303C 0020       MOVE.W     #32,D0              ; Get ready to zero all registers...
                  *                                   ; ( PC, SR, D0-D7, A0-A6 )_ Load...
                  *                                   ; count with 32 to move 33 words...
000026            INIT_LOOP                           ; because DBcc decr. to -1.
000026 3F3C 0000       MOVE.W     #0,-(A7)            ; Zero a register location on stack.
00002A 51C8 FFFA       DBF        D0,INIT_LOOP        ; Repeat if not done.
                  *
00002E 2C7C            MOVE.L     #0,A6               ; Initialize local frame pointer.
000034 4E56 0000       LINK       A6,#0               ; Push it onto stack so O/S can...
                  *                                   ; find bottom of supervisor stack.
000038 426D 0800       CLR.W      PANIC_HANDSHAKE(A5) ; Clear panic handshake flag.
00003C 42AD 0802       CLR.L      BPC_HANDSHAKE(A5)   ; Clear BPC interrupt handshake flag.
000040 4EBA 0000       JSR        PROC_INIT(PC)       ; Process manager initialization.
000044 4E5E            UNLK       A6
000046 4CDF 7FFF       MOVEM.L    (A7)+,D0/D1/D2/D3/D4/D5/D6/D7/A0/A1/A2/A3/A4/A5/A6
00004A 4E73            RTE                            ; Start the ball rolling for...
                                                      ; some process, possibly process 0.
                  *
                  *  END    < APROC_INIT

                  ************************************************************************
                  ***************************** Exception Table *************************
                  ************************************************************************

                                           **************
                                           ***** OH *****
                                           **************
```

```
                      ORG     0H
                                      ***** Reset *****
000000 0007 FFEE      DC.L    SUPER_STACK
000004             RESET_ADRS
000004 00000000       DC.L    APROC_INIT
                                    ***** Bus Error *****
000008 00000000       DC.L    PANIC_2
                                  ***** Address Error *****
00000C 00000000       DC.L    PANIC_3
                               ***** Illegal Instruction *****
000010 00000000       DC.L    PANIC_4
                                   ***** Zero Divide *****
000014 00000000       DC.L    PANIC_5
                                 ***** CHK Instruction *****
000018 00000000       DC.L    PANIC_6
                                ***** TRAPV Instruction *****
00001C 00000000       DC.L    PANIC_7
                               ***** Privilege Violation *****
000020 00000000       DC.L    PANIC_8
                                      ***** Trace *****
000024 00000000       DC.L    PANIC_9
                                ***** Line 1010 Emulator *****
000028 00000000       DC.L    PANIC_10
                                ***** Line 1111 Emulator *****
00002C 00000000       DC.L    PANIC_11
                                     ****************
                                     ***** 60H *****
                                     ****************
                      ORG     60H
                                ***** Spurious Interrupt *****
000060 00000000       DC.L    PANIC_24
                                     ****************
                                     ***** 80H *****
                                     ****************
                      ORG     80H
                                     ***** Trap 0 *****
000080 00000000       DC.L    CALL_
                                     ***** Trap 1 *****
000084 00000000       DC.L    PANIC_
                                     ***** Trap 2 *****
000088 00000000       DC.L    PANIC_
                                     ***** Trap 3 *****
00008C 00000000       DC.L    PANIC_
                                     ***** Trap 4 *****
000090 00000000       DC.L    PANIC_
                                     ***** Trap 5 *****
000094 00000000       DC.L    PANIC_
                                     ***** Trap 6 *****
000098 00000000       DC.L    PANIC_
                                     ***** Trap 7 *****
00009C 00000000       DC.L    PANIC_
                                     ***** Trap 8 *****
0000A0 00000000       DC.L    PANIC_
                                     ***** Trap 9 *****
0000A4 00000000       DC.L    PANIC_
                                    ***** Trap 10 *****
0000A8 00000000       DC.L    PANIC_
                                    ***** Trap 11 *****
0000AC 00000000       DC.L    PANIC_
                                    ***** Trap 12 *****
0000B0 00000000       DC.L    PANIC_
                                    ***** Trap 13 *****
0000B4 00000000       DC.L    PANIC_
                                    ***** Trap 14 *****
0000B8 00000000       DC.L    PANIC_
                                    ***** Trap 15 *****
0000BC 00000000       DC.L    PANIC_
                                     *****************
                                     ***** 100H *****
                                     *****************
                      ORG     100H
                                ***** Clock Interrupt *****
000100 00000000       DC.L    CLOCK_
                                 ***** BPC Interrupt *****
```

```
000104 00000000        DC.L     BPC_
                                          ******************
                                          ***** 800H *****
                                          ******************
                       ORG      800H
                                   ***** Panic Handshake Flag *****
000800                 PANIC_HANDSHAKE
000800 0000            DC.W     0
                               ***** BPC Interrupt Handshake Flag *****
000802                 BPC_HANDSHAKE
000802 0000 0000       DC.L     0
                                          ******************
                                          ***** 1000H *****
                                          ******************
                       ORG      1000H
                          ***** Null Fork Indicator For Process Manager *****
001000 FFFF FFFF       DC.L     -1
                                          ******************
                                          ***** 7FFF4H *****
                                          ******************
                       ORG      7FFF4H
                                   ***** Vector 65 For BPC *****
07FFF4 0041            DC.W     65
                                          ******************
                                          ***** 7FFF8H *****
                                          ******************
                       ORG      7FFF8H
                                   ***** Vector 64 For Clock *****
07FFF8 0040            DC.W     64
                                          ******************
                                          ***** 7FFFCH *****
                                          ******************
                       ORG      7FFFCH
                                   ***** Vector 64 For Clock *****
07FFFC 0040            DC.W     64
                       *
                       ****************************************************************************
                       **************************** Supervisor Stack ******************************
                       ****************************************************************************

                                          ******************
                                          ***** 7FFEEH *****
                                          ******************
                       ORG      7FFEEH
07FFEE                 SUPER_STACK
                                          ******************
                                          ***** 7FEFEH *****
                                          ******************
                       ORG      7FEFEH
07FEFE                 INIT_STACK
                                          ******************
                                          ***** 7FE80H *****
                                          ******************
                       ORG      7FE80H
07FE80                 DS.B     170H
                       END

Errors=    0

 00000000  1  "68000" PREPROCESS
 00000000  1  $EXTENSIONS ON$
 00000000  1  $TITLE "Soda 68000 O/S Process Manager Initialization"$
 00000000  1  PROGRAM P_INIT;
 00000000  1  (*
 00000000  1  ******************************** PROC_INIT ********************************
 00000000  1    PROC_INIT is the Soda 68000 Operating System process manager
 00000000  1    initialization routine.  It initializes all necessary data structures
 00000000  1    for the process manager, sets up process 0, then forks all other
 00000000  1    necessary "system" routines off.
 00000000  1    Author:  Kip Fulghum
 00000000  1    Date:  5-24-82   Revised:  4-5-83
 00000000  1  ****************************************************************************
 00000000  1
```

```
00000000 1     PROC_INIT sets up the process array and sets all global flags to
00000000 1     their initial values.  Process 0 is then created via a bogus process
00000000 1     1, all "systen" routines indicated in an external array are forked
00000000 1     off, then process 1 is exited, which opens the door for the first
00000000 1     process ( maybe process 0 ) to execute after the context switch.
00000000 1
00000000 1     Note:  a maxinun of 10 "systen" routines can be forked initially
00000000 1            fron the fork array!
00000000 1
00000000 1     PROC_INIT uses the following external routines:  NEWPROC
00000000 1     and EXIT.
00000000 1                                                                   *)
00000000 1  (*
00000000 1                         *************************
00000000 1                         ***** Include Files *****
00000000 1                         *************************
00000000 1                                                                   *)
00000000 1
00000000 1  #INCLUDE SYS_TYPES:SS_OS
00000000 1
00000000 1  VAR
00000000 1
00000000 1  $EXTVAR ON$
00000000 1    G_PROC_ARRAY:  PROC_ARRAY; (* Famous and omnipotent process
00000000 1                                  array.  Must be initialized *)
00000000 1
00000000 1    G_CUR_PROC  :  S_INT; (* Current active user process.  Initialized
00000000 1                             to 0 *)
00000000 1
00000000 1    G_TOP_PROC  :  S_INT; (* Current top of active processes in
00000000 1                             process array.  Initialized to 0 *)
00000000 1
00000000 1    G_RUN_RUN   :  S_INT; (* Non-zero indicates higher priority task
00000000 1                             is pending.  Initialized to 0 *)
00000000 1
00000000 1    G_P_ID      :  S_INT; (* NEWPROC's unique process I.D. counter.
00000000 1                             Initialized to 0 *)
00000000 1
00000000 1  $FAR ON$
00000000 1    INIT_STACK  :  S_INT; (* Top of initial user stack *)
00000000 1
00000000 1    PROC_0_STACK:  S_INT; (* Top of process 0's stack *)
00000000 1
00000000 1    PROCESS_0   :  L_INT; (* First instruction of process 0 *)
00000000 1  $FAR OFF$
00000000 1
00000000 1  $EXTVAR OFF$
00000000 1
00000000 1  $ORG OFBOH$ (* This ORG is closely tied to the size of FORK_ARRAY! *)
00000000 1    FORK_ARRAY  :  FORK_ARRAY_T; (* Array of routines to be forked off *)
00000000 1  $END_ORG$
00000000 1
00000000 1
00000000 1
00000000 1
00000000 1  (*
00000000 1                         *******************
00000000 1                         ***** NEWPROC *****
00000000 1                         *******************
00000000 1                                                                   *)
00000000 1  PROCEDURE NEWPROC ( PROC_ADDR, PROC_STACK:  L_INT; VAR ID:  S_INT );
00000000 2                      EXTERNAL;
00000000 1  (*
00000000 1    Procedure NEWPROC to create a new entry in the process array
00000000 1    given the process and process' stack addresses.  Provided as a Pascal
00000000 1    external.
00000000 1                                                                   *)
00000000 1
00000000 1
00000000 1
00000000 1
00000000 1
00000000 1  (*
00000000 1                              ****************
```

```
00000000  1                         ***** EXIT *****
00000000  1                         ****************
00000000  1                                                         *)
00000000  1  PROCEDURE EXIT; EXTERNAL;
00000000  1  (*
00000000  1    Procedure EXIT to remove a process from further execution:  its
00000000  1    status is set in limbo.  Provided as a Pascal external.
00000000  1                                                         *)
00000000  1
00000000  1
00000000  1
00000000  1
00000000  1
00000000  1  (*
00000000  1                       **********************
00000000  1                       ***** PROC_INIT *****
00000000  1                       **********************
00000000  1                                                         *)
00000000  1  $GLOBPROC ON$
00000000  1  PROCEDURE PROC_INIT;
00000000  2
00000000  2  VAR
00000000  2
00000000  2    NEW_ID    :  S_INT; (* I.D. for forked processes *)
00000002  2
00000002  2    I         :  NUM_PROCS; (* FOR/REPEAT loop index *)
00000003  2
00000003  2    TEMP_STACK:  L_INT; (* Temporary storage for stack address *)
00000008  2
00000008  2    TEMP_ADDR :  L_INT; (* Temporary storage for entry address *)
00000004  2
00000004  2  BEGIN (* Procedure PROC_INIT *)
00000004  2    FOR I := 0 TO MAX_PROCS-1 DO
00000008  2      WITH G_PROC_ARRAY [ I ] DO
0000001C  2        BEGIN (* Initialize process array *)
0000001C  2          P_ADDR := 0;
0000001E  2          P_TIME := 0;
00000026  2          P_CPU := 0;
0000002E  2          P_ID := 0;
00000036  2          P_PID := 0;
0000003E  2          P_STAT := NULL;
00000048  2          P_PRI := MIN_PRI;
00000052  2          P_SIG := 0;
0000005A  2          P_WCHAN := 0
00000062  2        END; (* Initialize process array *)
00000072  2    (* Initialize global variables *)
00000072  2    G_RUN_RUN := 0;
00000076  2    G_P_ID := 0;
0000007A  2    G_TOP_PROC := 0;
0000007E  2    (* Create bogus process 0 *)
0000007E  2    G_CUR_PROC := 0;
00000082  2    G_PROC_ARRAY [ 0 ].P_ADDR := L_INT ( ADDR ( INIT_STACK ) );
0000008C  2    G_PROC_ARRAY [ 0 ].P_STAT := RUN;
00000096  2    G_PROC_ARRAY [ 0 ].P_PRI := MAX_PRI;
000000A0  2    (* Fork off real process 0 *)
000000A0  2    TEMP_ADDR := L_INT ( ADDR ( PROCESS_0 ) );
000000AA  2    TEMP_STACK := L_INT ( ADDR ( PROC_0_STACK ) );
000000B4  2    NEWPROC ( TEMP_ADDR, TEMP_STACK, NEW_ID );
000000CA  2    G_CUR PROC := 1; (* Make all "system" routines think real process 0 is
000000D0  2                       their parent *)
000000D0  2    I := 10;
000000D6  2    REPEAT (* Fork off all "system" processes *)
000000D6  2      WITH FORK_ARRAY [ I ] DO
000000EC  2        BEGIN (* Check for valid process to fork *)
000000EC  2          IF XFER_ADDR = -1
000000FA  2            THEN (* Done:  get out of loop *)
000000FA  2              I := 0
00000102  2            ELSE (* Not done:  fork off this process *)
00000102  2              BEGIN (* Fork *)
00000102  2                NEWPROC ( XFER_ADDR, STACK_ADDR, NEW_ID );
0000011A  2                I := I - 1
0000011E  2              END (* Fork *)
0000011E  2        END; (* Check for valid process to fork *)
0000011E  2    UNTIL I = 0;
```

```
00000124  2    G_CUR_PROC := 0; (* Reset current process indicator *)
00000128  2    EXIT (* Say goodbye to bogus process 0, hello to real process 0 -
0000012C  2           maybe *)
0000012C  2  END; (* Procedure PROC_INIT *)
00000000  1  $GLOBPROC OFF$
00000000  1  .
```

End of compilation, number of errors=    0

```
00000000  1  "68000"
00000000  1  $EXTENSIONS ON$
00000000  1  $TITLE "Soda 68000 Operating System Process 0"$
00000000  1  PROGRAM PROC_0;
00000000  1  (*
00000000  1  ******************************* PROCESS_0 *******************************
00000000  1    PROCESS_0 is the process manager' process 0.  It sets in a tight loop
00000000  1    forever ( presumably at a very low priority ).
00000000  1    Author:  Kip Fulghum
00000000  1    Date:  5-18-82   Revised:  5-18-82
00000000  1  **************************************************************************
00000000  1
00000000  1    PROCESS_0 uses the following external routine:
00000000  1    SET_PRI_.
00000000  1                                                                         *)
00000000  1  (*
00000000  1                              ************************
00000000  1                              ***** Declarations *****
00000000  1                              ************************
00000000  1                                                                         *)
00000000  1  CONST
00000000  1
00000000  1    MIN_PRI = 100; (* Minimum allowable priority *)
00000000  1
00000000  1  TYPE
00000000  1
00000000  1    S_INT = SIGNED_16;
00000000  1
00000000  1    STACK = ARRAY [ 1..48 ] OF S_INT;
00000000  1
00000000  1  VAR
00000000  1
00000000  1    PROCESS_0_AREA:  STACK; (* Process 0's stack *)
00000060  1
00000060  1  $GLOBVAR ON$
00000060  1    PROC_0_STACK  :  S_INT; (* Top of process 0's stack *)
00000062  1  $GLOBVAR OFF$
00000000  1
00000000  1
00000000  1
00000000  1
00000000  1
00000000  1  PROCEDURE SET_PRI_ ( PRI:  S_INT ); EXTERNAL;
00000000  1  (*
00000000  1    Procedure SET_PRI_ to reset the current process' priority
00000000  1    to the given value.  Provided as a Pascal external.
00000000  1                                                                         *)
00000000  1
00000000  1
00000000  1
00000000  1
00000000  1
00000000  1  $GLOBPROC ON$
00000000  1  PROCEDURE PROCESS_0;
00000004  2  BEGIN (* Procedure PROCESS_0 *)
00000004  2    SET_PRI_ ( MIN_PRI ); (* Lower priority to lowest possible *)
0000000E  2    WHILE TRUE DO
00000010  2  END; (* Procedure PROCESS_0 *)
00000000  1  $GLOBPROC OFF$
00000000  1  .
```

End of compilation, number of errors=    0

```
(******************** File Name:  SYS_TYPES:SS.DS ********************)

CONST

(*
              *********************************************
              ***** Process and Priority Constants *****
              *********************************************
                                                                    *)

  MAX_PROCS      = 16; (* Maximum number of processes supported *)

  MAX_SLEEP_TIME = 3600; (* Maximum # clock ticks process is allowed
                            to time sleep - 60 seconds *)

  MIN_PRI        = 100; (* Minimum allowable priority *)

  MAX_PRI        = -100; (* Maximum allowable priority *)

(*
                    ****************************
                    ***** Panic Constants *****
                    ****************************
                                                                    *)
(*
            All positive values reserved for trap routines
                                                                    *)
  SWITCH_VALUE   = -1; (* SWITCH's procedure number *)

  NEWPROC_VALUE  = -2; (* NEWPROC's procedure number *)

TYPE

  L_INT = INTEGER;

  S_INT = SIGNED_16;

  PANIC_TYPE = L_INT;

(*
                  ********************************
                  ***** Process Array Types *****
                  ********************************
                                                                    *)

  STAT_TYPE = ( DOZE,  (* Process is sleeping *)
                RUN,    (* Process is active *)
                ZOMBIE, (* Process is ready to die *)
                NULL ); (* Null process *)

  PRI_TYPE = MAX_PRI..MIN_PRI; (* Process priority range:  the lower
                                   the number, the higher the priority *)

  PROC_REC = RECORD
              P_ADDR:  L_INT; (* Address of top of process' stack *)
              P_TIME:  L_INT; (* Total time process is active *)
              P_CPU:  L_INT; (* Total time process has CPU *)
              P_ID:  S_INT; (* Unique process I.D.:
                              <= 0 is illegal,
                              1 is for process 0 *)
              P_PID:  S_INT; (* Parent process I.D.:
                               <= 0 is illegal,
                               1 indicates ,   ess is "uard of the
                               state" - process 0 *)
              P_STAT:  STAT_TYPE; (* Current process status *)
              P_PRI:  PRI_TYPE; (* Current process priority *)
              P_SIG:  L_INT; (* Process signal *)
              P_WCHAN:  L_INT; (* Signal sleeper is waiting on or time
                                 count if timed sleep *)
(***** DEBUG *****)
              DUMMY:  ARRAY [ 0..2 ] OF S_INT
(***** DEBUG *****)
            END; (* Of process record *)
```

```
NUM_PROCS = 0..MAX_PROCS-1;

PROC_ARRAY = ARRAY [ NUM_PROCS ] OF PROC_REC;

(*
                 *****************************
                 ***** Fork Array Types *****
                 *****************************
                                                        *)

FORK_REC = RECORD
           STACK_ADDR:  L_INT; (* Process stack address *)
           XFER_ADDR:  L_INT (* Process transfer address *)
          END; (* Of fork record *)

FORK_ARRAY_T = ARRAY [ 1..10 ] OF FORK_REC;
{ICDS_68K:SODAME}

REQUEST_TYPE = (
          NO_MESSAGE,                 { 0 }
          YOU_THERE,                  { 1 }
          IM_HERE,                    { 2 }
          WHO_ARE_YOU,                { 3 }
          EMPTY,                      { 4 }
          RESPONSE,                   { 5 }
          CLOSE_REQUEST,              { 6 }
          CREATE_REQUEST,             { 7 }
          DELETE_REQUEST,             { 8 }
          OPEN_REQUEST,               { 9 }
          ADVANCE_REQUEST,            { A }
          BACKUP_REQUEST,             { B }
          POSITION_REQUEST,           { C }
          READ_REQUEST,               { D }
          READBACKWARD_REQUEST,       { E }
          READ_DCB_ADDR_REQUEST,      { F }
          WRITE_REQUEST,              { 10 }
          FILE_ERR_REQUEST,           { 11 }
          READ_REC_NUM_REQUEST,       { 12 }
          WRITEBACKWARD_REQUEST,      { 13 }
          DEFINE_IMB_REQUEST,         { 14 }
          DUMMY_1,                    { 15 }
          MESSAGE_REQUEST,            { 16 }
          READ_MEM_REQUEST,           { 17 }
          WRITE_MEM_REQUEST,          { 18 }
          LOAD_ABS_REQUEST,           { 19 }
          BREAK_REQUEST,              { 1A }
          RESET_REQUEST,              { 1B }
          RUN_REQUEST,                { 1C }
          DUMMY_2,                    { 1D }
          DUMMY_3,                    { 1E }
          EMUL_MSG_REQUEST,           { 1F }
          DUMMY_4,                    { 20 }
          READ_REG_REQUEST,           { 21 }
          EMUL_STATUS_REQUEST,        { 22 }
          GET_SEG_REGS_REQUEST,       { 23 }
          DUMMY_5,                    { 24 }
          DUMMY_6,                    { 25 }
          G_AREA_ADDR_REQUEST,        { 26 }
          BPC_READ_REQUEST,           { 27 }
          BPC_WRITE_REQUEST,          { 28 }
          FORMATTER_REQUEST,          { 29 }
          CALENDAR_REQUEST,           { 2A }
          OUTIT_REQUEST               { 2B }
          );
CDS_TYPE = RECORD
          PANIC_FLAG : INT;
          INT_68K_HANDSHAKE : INTEGER;
          INT_BPC_HANDSHAKE : INT;
          REQUEST_TYPE : INT;
          COMMAND : INT;
          POLL_FLAG : INT;
          PARAMATERS : ARRAY[0..31] OF INT;
          IMB_REQUEST : INT;
          HARDWARE_STATUS : INT;
          END;
```

```
                         "68000"

                                         DATA

                                         GLOBAL CDS
                                         GLOBAL PARM_BLOCK

000000 FFFF                CDS           DC.W -1        PANIC_FLAG
000002 0000 0000                         DC.L 0         INT_68K_HANDSHAKE
000006 0000                              DC.W 0         INT_BPC_HANDSHAKE
000008 FFFF                              DC.W -1        REQUEST_TYPE
00000A 0000 0000                         DC.L 0         REQUEST_PTR
00000E 0000                              DC.W 0         COMMAND
000010 0000                              DC.W 0         POLL
000012 0000                PARM_BLOCK    DC.W 0         PARM_BLOCK      0
000014 0000                              DC.W 0
000016 0000                              DC.W 0
000018 0000                              DC.W 0
00001A 0000                              DC.W 0
00001C 0000                              DC.W 0
00001E 0000                              DC.W 0
000020 0000                              DC.W 0
000022 0000                              DC.W 0                         8
000024 0000                              DC.W 0
000026 0000                              DC.W 0
000028 0000                              DC.W 0
00002A 0000                              DC.W 0
00002C 0000                              DC.W 0
00002E 0000                              DC.W 0
000030 0000                              DC.W 0
000032 0000                              DC.W 0                         10
000034 0000                              DC.W 0
000036 0000                              DC.W 0
000038 0000                              DC.W 0
00003A 0000                              DC.W 0
00003C 0000                              DC.W 0
00003E 0000                              DC.W 0
000040 0000                              DC.W 0
000042 0000                              DC.W 0                         18
000044 0000                              DC.W 0
000046 0000                              DC.W 0
000048 0000                              DC.W 0
00004A 0000                              DC.W 0
00004C 0000                              DC.W 0
00004E 0000                              DC.W 0
000050 0000                              DC.W 0
000052 0000                              DC.W 0         INB_REQUEST
000054 0000                              DC.W 0         HARDWARE_STATUS

                                         ORG 1010H

001010 0000 0000           APPLY_STACK   DC.L 0

                                         END

Errors=    0
```

```
"68000"

*************************************************************************
*                                                                       *
*  linked at location 12000H                                            *
*                                                                       *
*************************************************************************

*************************************************************************
*                                                                       *
*  ENTRY POINTS                                                         *
*                                                                       *
*************************************************************************

*************************************************************************
*                                                                       *
*  P_CLOSE (VAR DCB : INT; VAR FMGR_CODE : INT);                        *
```

```
              *                                                                        *
              *  INPUT:  1) DCB IS THE FIRST WORD OF THE DCB                           *
              *                                                                        *
              *  OUTPUT:  1) FMGR_CODE, THE FILE MANAGER ERROR CODE                    *
              *              0 = NO ERROR:  ACTION COMPLETED                           *
              *              3 = FILE NOT FOUND                                        *
              *                                                                        *
              **************************************************************************
                             GLOBAL P_CLOSE
000000 60FE   P_CLOSE        BRA P_CLOSE
000002                       DS.W 1

              **************************************************************************
              *                                                                        *
              *  P_CREATE (VAR FNAME : VECTOR0_7; FTYPE, DISC : INT; VAR DCB : INT;    *
              *           BUFSIZE : INT; VAR FMGR_CODE : INT);                         *
              *                                                                        *
              *  INPUT:  1) FNAME IS THE FIRST WORD OF THE FILE NAME AS REQUIRED BY    *
              *              CREATE                                                    *
              *          2) FTYPE IS THE FILE TYPE                                     *
              *          3) DISC IS THE DISC NUMBER                                    *
              *          4) DCB IS THE FIRST WORD OF THE DCB                           *
              *          5) BSZ IS THE # SECTORS TO BE INCLUDED IN THE DCB             *
              *                                                                        *
              *  OUTPUT:  1) FMGR_CODE, THE FILE MANAGER ERROR CODE                    *
              *              0 = NO ERROR:  ACTION COMPLETED                           *
              *              2 = INVALID DISC ( SHOULD NEVER HAPPEN )                  *
              *              4 = FILE ALREADY EXISTS                                   *
              *              5 = NO FREE PAGES AVAILABLE:  DISC FULL                   *
              *              6 = NO DIRECTORY SPACE AVAILABLE                          *
              *                                                                        *
              **************************************************************************
                             GLOBAL P_CREATE
000004 60FE   P_CREATE       BRA P_CREATE
000006                       DS.W 1

              **************************************************************************
              *                                                                        *
              *  P_DELETE (VAR FNAME : VECTOR0_7; FTYPE, DISC : INT;                   *
              *           VAR DCB : INT; VAR FMGR_CODE : INT);                         *
              *                                                                        *
              *  INPUT:  1) FNAME IS THE FIRST WORD OF THE FILE NAME AS REQUIRED BY    *
              *              CREATE                                                    *
              *          2) FTYPE IS THE FILE TYPE                                     *
              *          3) DISC IS THE DISC NUMBER                                    *
              *          4) DCB IS THE FIRST WORD OF THE DCB                           *
              *                                                                        *
              *  OUTPUT:  1) FMGR_CODE, THE FILE MANAGER ERROR CODE                    *
              *              0 = NO ERROR:  ACTION COMPLETED                           *
              *              2 = INVALID DISC ( SHOULD NEVER HAPPEN )                  *
              *              3 = FILE NOT FOUND                                        *
              *                                                                        *
              **************************************************************************
                             GLOBAL P_DELETE
000008 60FE   P_DELETE       BRA P_DELETE
00000A                       DS.W 1

              **************************************************************************
              *                                                                        *
              *  P_OPEN (VAR FNAME : VECTOR0_7; FTYPE, DISC : INT; VAR DCB : INT;      *
              *           BUFSIZE : INT; VAR FMGR_CODE : INT);                         *
              *                                                                        *
              *  INPUT:  1) FNAME IS THE FIRST WORD OF THE FILE NAME AS REQUIRED BY    *
              *              OPEN                                                      *
              *          2) FTYPE IS THE FILE TYPE                                     *
              *          3) DISC IS THE DISC NUMBER                                    *
              *          4) DCB IS THE FIRST WORD OF THE DCB                           *
              *          5) BSZ IS THE # SECTORS TO BE INCLUDED IN THE DCB             *
              *                                                                        *
              *  OUTPUT:  1) FMGR_CODE, THE FILE MANAGER ERROR CODE                    *
              *              0 = NO ERROR:  ACTION COMPLETED                           *
              *              3 = FILE NOT FOUND                                        *
              *                                                                        *
              **************************************************************************
```

```
                              GLOBAL P_OPEN
00000C 60FE       P_OPEN      BRA P_OPEN
00000E                        DS.W 1

          ***********************************************************************
          *                                                                     *
          * P_ADVANCE (VAR DCB : INT; NREC : INT; VAR FMGR_CODE : INT);         *
          *                                                                     *
          * INPUT:  1) DCB IS THE FIRST WORD OF THE FILE'S DCB                  *
          *         2) NREC IS THE NUMBER OF RECORDS TO MOVE                    *
          *                                                                     *
          * OUTPUT:  1) FMGR_CODE, THE FILE MANAGER ERROR CODE                  *
          *             0 = NO ERROR:  ACTION COMPLETED                         *
          *             1 = END OF FILE                                         *
          *             2 = INVALID DISC ( SHOULD NEVER HAPPEN )                *
          *             7 = FILE IS CORRUPT: BAD LINKAGE                        *
          *                                                                     *
          ***********************************************************************
                              GLOBAL P_ADVANCE
000010 60FE       P_ADVANCE   BRA P_ADVANCE
000012                        DS.W 1

          ***********************************************************************
          *                                                                     *
          * P_BACKUP (VAR DCB : INT; NREC : INT; VAR FMGR_CODE : INT);          *
          *                                                                     *
          * INPUT:  1) DCB IS THE FIRST WORD OF THE FILE'S DCB                  *
          *         2) NREC IS THE NUMBER OF RECORDS TO MOVE                    *
          *                                                                     *
          * OUTPUT:  1) FMGR_CODE, THE FILE MANAGER ERROR CODE                  *
          *             0 = NO ERROR:  ACTION COMPLETED                         *
          *             1 = END OF FILE                                         *
          *             2 = INVALID DISC ( SHOULD NEVER HAPPEN )                *
          *             7 = FILE IS CORRUPT: BAD LINKAGE                        *
          *                                                                     *
          ***********************************************************************
                              GLOBAL P_BACKUP
000014 60FE       P_BACKUP    BRA P_BACKUP
000016                        DS.W 1

          ***********************************************************************
          *                                                                     *
          * P_POSITION (VAR DCB : INT; RECN : INT; VAR FMGR_CODE : INT);        *
          *                                                                     *
          * INPUT:  1) DCB IS THE FIRST WORD OF THE FILE'S DCB                  *
          *         2) RECN IS THE RECORD NUMBER                                *
          *                                                                     *
          * OUTPUT:  1) FMGR_CODE, THE FILE MANAGER ERROR CODE                  *
          *             0 = NO ERROR:  ACTION COMPLETED                         *
          *             1 = END OF FILE                                         *
          *             2 = INVALID DISC ( SHOULD NEVER HAPPEN )                *
          *             7 = FILE IS CORRUPT: BAD LINKAGE                        *
          *                                                                     *
          ***********************************************************************
                              GLOBAL P_POSITION
000018 60FE       P_POSITION  BRA P_POSITION
00001A                        DS.W 1

          ***********************************************************************
          *                                                                     *
          * P_READ (VAR DCB : INT; VAR RBUFF : BUFF_TYPE; LENGTH : INT;         *
          *         VAR FMGR_CODE : INT);                                       *
          *                                                                     *
          * INPUT:  1) DCB IS THE FIRST WORD OF THE FILE'S DCB                  *
          *         2) RBUFF IS THE FIRST WORD OF THE RECORD BUFFER             *
          *         3) LENGTH IS THE MAXIMUM WORD LENGTH OF THE RECORD          *
          *                                                                     *
          * OUTPUT:  1) FMGR_CODE, THE FILE MANAGER ERROR CODE                  *
          *             0 = NO ERROR:  ACTION COMPLETED                         *
          *             1 = END OF FILE                                         *
          *             2 = INVALID DISC ( SHOULD NEVER HAPPEN )                *
          *             7 = FILE IS CORRUPT: BAD LINKAGE                        *
          *                                                                     *
          ***********************************************************************
```

```
                                     GLOBAL P_READ
00001C 60FE        P_READ            BRA P_READ
00001E                               DS.W 1

                   ****************************************************************************
                   *                                                                          *
                   *  P_READBACKWARD (VAR DCB : INT; VAR RBUFF : BUFF_TYPE; LENGTH : INT;     *
                   *           VAR FMGR_CODE : INT);                                          *
                   *                                                                          *
                   *  INPUT:  1) DCB IS THE FIRST WORD OF THE FILE'S DCB                      *
                   *          2) RBUFF IS THE FIRST WORD OF THE RECORD BUFFER                 *
                   *          3) LENGTH IS THE MAXIMUM WORD LENGTH OF THE RECORD              *
                   *                                                                          *
                   *  OUTPUT:  1) FMGR_CODE, THE FILE MANAGER ERROR CODE                      *
                   *              0 = NO ERROR:  ACTION COMPLETED                             *
                   *              1 = END OF FILE                                             *
                   *              2 = INVALID DISC ( SHOULD NEVER HAPPEN )                    *
                   *              7 = FILE IS CORRUPT: BAD LINKAGE                            *
                   *                                                                          *
                   ****************************************************************************
                                     GLOBAL P_READBACKWARD
000020 60FE        P_READBACKWARD    BRA P_READBACKWARD
000022                               DS.W 1

                   ****************************************************************************
                   *                                                                          *
                   *  READ_DCB_ADDR (VAR DCB : INT; VAR ADDRESS : INT;                        *
                   *                 VAR FMGR_CODE : INT);                                    *
                   *                                                                          *
                   *  INPUT:  1) DCB IS THE FIRST WORD OF THE DCB                             *
                   *                                                                          *
                   *  OUTPUT:  1) ADDRESS IS THE DPC ADDRESS OF THE DCB                       *
                   *           2) FMGR_CODE, THE FILE MANAGER ERROR CODE                      *
                   *              0 = NO ERROR:  ACTION COMPLETED                             *
                   *              2 = INVALID DISC ( SHOULD NEVER HAPPEN )                    *
                   *                                                                          *
                   ****************************************************************************
                                     GLOBAL READ_DCB_ADDR
000024 60FE        READ_DCB_ADDR     BRA READ_DCB_ADDR
000026                               DS.W 1

                   ****************************************************************************
                   *                                                                          *
                   *  P_WRITE (VAR DCB : INT; VAR RBUFF : BUFF_TYPE; VAR FMGR_CODE : INT);*
                   *                                                                          *
                   *  INPUT:  1) DCB IS THE FIRST WORD OF THE FILE'S DCB                      *
                   *          2) RBUFF IS THE FIRST WORD OF THE RECORD BUFFER                 *
                   *                                                                          *
                   *  OUTPUT:  1) FMGR_CODE, THE FILE MANAGER ERROR CODE                      *
                   *              0 = NO ERROR:  ACTION COMPLETED                             *
                   *              2 = INVALID DISC ( SHOULD NEVER HAPPEN )                    *
                   *              5 = NO FREE PAGES AVAILABLE:  DISC FULL                     *
                   *              7 = FILE IS CORRUPT: BAD LINKAGE                            *
                   *                                                                          *
                   ****************************************************************************
                                     GLOBAL P_WRITE
000028 60FE        P_WRITE           BRA P_WRITE
00002A                               DS.W 1

                   ****************************************************************************
                   *                                                                          *
                   *  P_FILE_ERR (VAR DCB : INT; FMGR_CODE : INT);                            *
                   *                                                                          *
                   *  INPUT:  1) DCB IS THE FIRST WORD OF THE DCB                             *
                   *          2) FMGR_CODE IS THE FILE MANAGER ERROR CODE                     *
                   *                                                                          *
                   *  OUTPUT: none                                                            *
                   *                                                                          *
                   ****************************************************************************
                                     GLOBAL P_FILE_ERR
00002C 60FE        P_FILE_ERR        BRA P_FILE_ERR
00002E                               DS.W 1

                   ****************************************************************************
```

```
         *                                                              *
         *  P_READRECNUM (VAR DCB, REC_NUM, FMGR_CODE : INT);           *
         *                                                              *
         *  INPUT:  1) DCB IS THE FIRST WORD OF THE DCB                 *
         *          2) REC_NUM IS THE CURRENT RECORD NUMBER             *
         *                                                              *
         *  OUTPUT:  1) FMGR_CODE, THE FILE MANAGER ERROR CODE          *
         *              0 = NO ERROR:  ACTION COMPLETED                 *
         *              3 = FILE NOT FOUND                              *
         *                                                              *
         ****************************************************************
                                GLOBAL P_READRECNUM
000030 60FE      P_READRECNUM   BRA P_READRECNUM
000032                          DS.W 1

         ****************************************************************
         *                                                              *
         *  P_WRITEBACKWARD (VAR DCB : INT; VAR RBUFF : BUFF_TYPE;      *
         *                   VAR FMGR_CODE : INT);                      *
         *                                                              *
         *  INPUT:  1) DCB IS THE FIRST WORD OF THE FILE'S DCB          *
         *          2) RBUFF IS THE FIRST WORD OF THE RECORD BUFFER     *
         *                                                              *
         *  OUTPUT:  1) FMGR_CODE, THE FILE MANAGER ERROR CODE          *
         *              0 = NO ERROR:  ACTION COMPLETED                 *
         *              2 = INVALID DISC ( SHOULD NEVER HAPPEN )        *
         *              5 = NO FREE PAGES AVAILABLE:  DISC FULL         *
         *              7 = FILE IS CORRUPT: BAD LINKAGE                *
         *                                                              *
         ****************************************************************
                                GLOBAL P_WRITEBACKWARD
000034 60FE      P_WRITEBACKWARD BRA P_WRITEBACKWARD
000036                          DS.W 1

         ****************************************************************
         *                                                              *
         *  DEFINE_IMB (ACTION : INT; REQUEST : INT; VAR RETURN_CODE : INT);  *
         *                                                              *
         *  INPUT:  1) ACTION IS THE IMB ACTION TO PERFORM              *
         *              0 = DRIVE IMB LINE                              *
         *              1 = RECEIVE IMB LINE                            *
         *          2) REQUEST IS THE LINE TO TURN ON OR OFF            *
         *              (SEE IMB DOCUMENTATION)                         *
         *                                                              *
         *  OUTPUT:  1) RETURN_CODE IS THE ERROR RETURN                 *
         *              (SEE IMB DOCUMENTATION)                         *
         *                                                              *
         ****************************************************************
                                GLOBAL DEFINE_IMB
000038 60FE      DEFINE_IMB     BRA DEFINE_IMB
00003A                          DS.W 1

         ****************************************************************
         *                                                              *
         *  DUMMY_1                                                     *
         *                                                              *
         ****************************************************************
         *                      GLOBAL DUMMY_1
00003C 60FE      DUMMY_1        BRA DUMMY_1
00003E                          DS.W 1

         ****************************************************************
         *                                                              *
         *  P_MESSAGE (MESS_PTR : BUFF_PTR; CODE : INT);                *
         *                                                              *
         *  INPUT:  1) MESS_PTR IS A POINTER TO THE FIRST WORD OF THE MESSAGE  *
         *          2) CODE IS THE MESSAGE DEFINITION (STATUS/ERROR ETC.)      *
         *                                                              *
         *  OUTPUT:  none                                               *
         *                                                              *
         ****************************************************************
                                GLOBAL P_MESSAGE
000040 60FE      P_MESSAGE      BRA P_MESSAGE
000042                          DS.W 1
```

```

                    ******************************************************************************
                    *                                                                            *
                    *  READ_MEM (ADDRESS:DOUBLE_WORD; COUNT:INT; VAR DATA:INTEGER;               *
                    *            VAR ERROR:MEMACC_ERRTYPE);                                      *
                    *                                                                            *
                    *  INPUT:  1)ADDRESS: THE STARTING EMULATION ADDRESS TO READ                 *
                    *                     IT IS 2 WORDS STORED LSW,MSW                           *
                    *          2)COUNT:   THE NUMBER OF BYTES TO READ                            *
                    *          3)DATA:    THE PLACE TO PUT THE DATA (USED AS A POINTER)          *
                    *                                                                            *
                    *                                                                            *
                    *  OUTPUT:  1) COUNT BYTES FROM DATA ARE FILLED WITH INFORMATION             *
                    *           2) ERROR CODES                                                   *
                    *                0-NO_ERROR                                                  *
                    *                1-GUARDED MEMORY                                            *
                    *                2-NO USER MEMORY                                            *
                    *                3-MONITOR ERROR                                             *
                    *                4-NOT IN MONITOR                                            *
                    *                                                                            *
                    ******************************************************************************
                                       GLOBAL READ_MEM
000044 60FE         READ_MEM           BRA READ_MEM
000046                                 DS.W 1

                    ******************************************************************************
                    *                                                                            *
                    * WRITE_MEM (ADDRESS:DOUBLE_WORD; COUNT:INT; VAR DATA:INTEGER;               *
                    *            VAR ERROR:MEMACC_ERRTYPE; TRGMEM:MTYPE);                        *
                    *                                                                            *
                    *  INPUT:  1)ADDRESS: THE STARTING EMULATION ADDRESS TO WRITE TO             *
                    *                     IT IS 2 WORDS STORED LSW,MSW                           *
                    *          2)COUNT:   THE NUMBER OF BYTES TO WRITE                           *
                    *          3)DATA:    THE PLACE TO GET THE DATA (USED AS A POINTER)          *
                    *          4)TRGMEM:  THE TYPE OF MEMORY TO WRITE TO                         *
                    *                     (BOTH,EMUL,USER)                                       *
                    *                                                                            *
                    *                                                                            *
                    *  OUTPUT:  1) COUNT BYTES STARTING FROM ADDRESS ARE FILLED WITH             *    *
                    *              THE INFORMATION FROM DATA                                     *
                    *           2) ERROR CODES                                                   *
                    *                0-NO_ERROR                                                  *
                    *                1-GUARDED MEMORY                                            *
                    *                2-NO USER MEMORY                                            *
                    *                3-MONITOR ERROR                                             *
                    *                4-NOT IN MONITOR                                            *
                    *                                                                            *
                    ******************************************************************************
                                       GLB WRITE_MEM
000048 60FE         WRITE_MEM          BRA WRITE_MEM
00004A                                 DS.W 1

                    ******************************************************************************
                    *                                                                            *
                    *  LOAD_ABS (VAR FILE_NAME:NAME; DISC:INT; MEM:MTYPE; VAR ERROR:INT);        *
                    *                                                                            *
                    *  INPUT:  1)FILE_NAME : ARRAY [0..7] CONTAINING THE FILE NAME IN            *
                    *                        STANDARD PISCES FORMAT                              *
                    *          2)DISC      : THE DISC NUMBER OF THE FILE (-1 = ANY DISC)         *
                    *          2)MEM       : THE TYPE OF MEMORY TO LOAD                          *
                    *                        (BOTH,EMUL,USER)                                    *
                    *                                                                            *
                    *  OUTPUT: 1)THE ABSOLUTE FILE FILE_NAME GETS LOADED AND A CHECK IS          *
                    *            DONE TO SEE IF THE MONITOR WAS LOADED ALONG WITH IT.            *
                    *            IF SO THEN A GLOBAL IS SET                                      *
                    *          2) ERROR IS THE LOAD ERROR RETURN                                 *
                    *                                                                            *
                    ******************************************************************************
                                       GLOBAL LOAD_ABS_FILE
00004C 60FE         LOAD_ABS_FILE      BRA LOAD_ABS_FILE
00004E                                 DS.W 1

                    ******************************************************************************
                    *                                                                            *
```

```
                 *  O_APPLY_BREAK ;                                                        *
                 *                                                                         *
                 *  INPUT:  1)   NONE                                                      *
                 *                                                                         *
                 *  OUTPUT.  1)  THE RUNNING PROGRAM IS INTERRUPTED AND CONTROL IS         *
                 *               RETURNED TO THE MONITOR                                   *
                 ***************************************************************************
                                 GLOBAL O_APPLY_BREAK
000050 60FE       O_APPLY_BREAK  BRA O_APPLY_BREAK
000052                           DS.W 1

                 ***************************************************************************
                 *                                                                         *
                 *  APPLY_RESET ;                                                          *
                 *                                                                         *
                 *  INPUT:  1)  NONE                                                       *
                 *                                                                         *
                 *  OUTPUT: 1)  RESETS THE PROCESSOR                                       *
                 *                                                                         *
                 ***************************************************************************
                                 GLOBAL APPLY_RESET
000054 60FE       APPLY_RESET    BRA APPLY_RESET
000056                           DS.W 1

                 ***************************************************************************
                 *                                                                         *
                 *  RUN (ADDRESS:DOUBLE_WORD; RUN_FROM:INT; VAR ERROR : INT);              *
                 *                                                                         *
                 *  INPUT:  1)ADDRESS: THE STARTING EMULATION ADDRESS TO RUN FROM          *
                 *                     IT IS 2 WORDS STORED LSW,MSW                        *
                 *          2)RUN_FROM: A FLAG TO INDICATE IF THE RUN IS TO BE FROM        *
                 *                     0 = PC                                              *
                 *                     1 = ADDRESS                                         *
                 *                     2 = TRANSFER ADDRESS                                *
                 *          3)ERROR : 0 IF SUCESSFUL                                       *
                 *                                                                         *
                 *  OUTPUT: 1)THE PC IS LOADED OR NOT AND A JSM PC EXECUTED                *
                 *                                                                         *
                 ***************************************************************************
                                 GLOBAL RUN
000058 60FE       RUN            BRA RUN
00005A                           DS.W 1

                 ***************************************************************************
                 *                                                                         *
                 *  DUMMY_2                                                                *
                 *                                                                         *
                 ***************************************************************************
                 *               GLOBAL DUMMY_2
00005C 60FE       DUMMY_2        BRA DUMMY_2
00005E                           DS.W 1

                 ***************************************************************************
                 *                                                                         *
                 *  DUMMY_3                                                                *
                 *                                                                         *
                 ***************************************************************************
                 *               GLOBAL DUMMY_3
000060 60FE       DUMMY_3        BRA DUMMY_3
000062                           DS.W 1

                 ***************************************************************************
                 *                                                                         *
                 *  EMUL_MSG (STACK_MSG : BOOLEAN);                                        *
                 *                                                                         *
                 *  INPUT:  1) STACK_MSG TRUE INDICATES TO STACK THE MESSAGE               *
                 *                                                                         *
                 *  OUTPUT:  NONE                                                          *
                 *                                                                         *
                 ***************************************************************************
                                 GLOBAL EMUL_MSG
000064 60FE       EMUL_MSG       BRA EMUL_MSG
000066                           DS.W 1
```

```
            ************************************************************************
            *                                                                      *
            *  DUMMY_4                                                             *
            *                                                                      *
            ************************************************************************
            *               GLOBAL DUMMY_4
00006B 60FE DUMMY_4         BRA DUMMY_4
00006A                      DS.W 1

            ************************************************************************
            *                                                                      *
            *  READ_REG (REG : INT; VAR VALUE : INTEGER);                          *
            *                                                                      *
            *  INPUT:  1) REG IS THE REGISTER NUMBER TO READ                       *
            *             0 = PC                                                   *
            *             1 = BASE POINTER ON ENTRY                                *
            *             2 = BASE POINTER WITHIN                                  *
            *                                                                      *
            *  OUTPUT: 1) VALUE IS THE CONTENTS OF THE REQUESTED REGISTER          *
            *                                                                      *
            ************************************************************************
                            GLOBAL READ_REG
00006C 60FE READ_REG        BRA READ_REG
00006E                      DS.W 1

            ************************************************************************
            *                                                                      *
            *  EMUL_STATUS (NUMBER : INT; VAR ERROR : INT);                        *
            *                                                                      *
            *  INPUT:  1) NUMBER IS HOW MANY TIMES TO ASK                          *
            *                                                                      *
            *  OUTPUT:  1) ERROR : 0 IF MONITOR IS THERE                           *
            *                                                                      *
            ************************************************************************
                            GLOBAL EMUL_STATUS
000070 60FE EMUL_STATUS     BRA EMUL_STATUS
000072                      DS.W 1

            ************************************************************************
            *                                                                      *
            *  GET_SEG_REGS(VAR TBL : ARRAY[0..15] OF INTEGER);                    *
            *                                                                      *
            *  INPUT:  1) NONE                                                     *
            *                                                                      *
            *  OUTPUT:  1) TABLE OF 16 SEGMENT REGISTERS                           *
            *                                                                      *
            ************************************************************************
                            GLOBAL GET_SEG_REGS
000074 60FE GET_SEG_REGS    BRA GET_SEG_REGS
000076                      DS.W 1

            ************************************************************************
            *                                                                      *
            *  DUMMY_5                                                             *
            *                                                                      *
            ************************************************************************
            *               GLOBAL DUMMY_5
000078 60FE DUMMY_5         BRA DUMMY_5
00007A                      DS.W 1

            ************************************************************************
            *                                                                      *
            *  DUMMY_6                                                             *
            *                                                                      *
            ************************************************************************
            *               GLOBAL DUMMY_6
00007C 60FE DUMMY_6         BRA DUMMY_6
00007E                      DS.W 1

            ************************************************************************
            *                                                                      *
            *  G_AREA_ADDR (VAR ADDRESS : INT ) ;                                  *
            *                                                                      *
            *  INPUT:  1) none                                                     *
```

```
                   *                                                              *
                   *  OUTPUT:  1) ADDRESS IS THE BPC ADDRESS OF THE G_AREA        *
                   *                                                              *
                   ****************************************************************
                                    GLOBAL G_AREA_ADDR
000080 60FE        G_AREA_ADDR      BRA G_AREA_ADDR
000082                              DS.W 1

                   ****************************************************************
                   *                                                              *
                   *  BPC_READ (ADDR_68K : BUFF_PTR; ADDR_BPC : INT; LENGTH : INT);  *
                   *                                                              *
                   *  INPUT:  1) ADDR_68K IS THE 68000 DESTINATION ADDRESS        *
                   *          2) ADDR_BPC IS THE BPC SOURCE ADDRESS               *
                   *          3) LENGTH IS THE LENGTH IN WORDS                    *
                   *                                                              *
                   *  OUTPUT:  none                                               *
                   *                                                              *
                   ****************************************************************
                                    GLOBAL BPC_READ
000084 60FE        BPC_READ         BRA BPC_READ
000086                              DS.W 1

                   ****************************************************************
                   *                                                              *
                   *  BPC_WRITE (ADDR_68K : BUFF_PTR; ADDR_BPC : INT; LENGTH : INT);  *
                   *                                                              *
                   *  INPUT:  1) ADDR_68K IS THE 68000 DESTINATION ADDRESS        *
                   *          2) ADDR_BPC IS THE BPC ADDRESS                      *
                   *          3) LENGTH IS THE LENGTH IN WORDS                    *
                   *                                                              *
                   *  OUTPUT:  none                                               *
                   *                                                              *
                   ****************************************************************
                                    GLOBAL BPC_WRITE
000088 60FE        BPC_WRITE        BRA BPC_WRITE
00008A                              DS.W 1

                   ****************************************************************
                   *                                                              *
                   *  P_FORMATTER (TABLE : BUFF_PTR; DESTINATION : PTR);          *
                   *                                                              *
                   *  INPUT:  1) TABLE IS THE ADDRESS OF THE FORMATTER TABLE      *
                   *          2) DESTINATION IS THE ADDRESS OF THE DESTINATION    *
                   *                                                              *
                   *  OUTPUT:  none                                               *
                   *                                                              *
                   ****************************************************************
                                    GLOBAL P_FORMATTER
00008C 60FE        P_FORMATTER      BRA P_FORMATTER
00008E                              DS.W 1

                   ****************************************************************
                   *                                                              *
                   *  P_CALENDAR (STRING_PTR : INTEGER);                          *
                   *                                                              *
                   *  INPUT:  none                                                *
                   *                                                              *
                   *  OUTPUT:  1) STRING_PTR IS A POINTER TO WHERE THE ASCII SYSTEM  *
                   *              TIME AND DATE IS TO BE PLACED                   *
                   *                                                              *
                   ****************************************************************
                                    GLOBAL P_CALENDAR
000090 60FE        P_CALENDAR       BRA P_CALENDAR
000092                              DS.W 1

                   ****************************************************************
                   *                                                              *
                   *  OUTIT (LETTER : INT; VALUE : INT; BASE : INT);              *
                   *                                                              *
                   *  INPUT:  1) LETTER IS THE LETTER TO PRINT                    *
                   *          2) VALUE IS THE NUMERIC VALUE TO PRINT              *
                   *          3) BASE IS THE DISPLAY BASE                         *
                   *                                                              *
```

```
                 *  OUTPUT:  none                                                  *
                 *                                                                 *
                 *******************************************************************
                                  GLOBAL OUTIT
000094 60FE       OUTIT           BRA OUTIT
000096                            DS.W 1

                 *******************************************************************
                 *                                                                 *
                 *  NEW (VAR POINTER : PTR);                                       *
                 *                                                                 *
                 *  INPUT:  1) POINTER IS A TYPED POINTER                          *
                 *                                                                 *
                 *  OUTPUT:  none                                                  *
                 *                                                                 *
                 *******************************************************************
                                  GLOBAL NEW
000098 60FE       NEW             BRA NEW
00009A                            DS.W 1

                 *******************************************************************
                 *                                                                 *
                 *  DISPOSE (VAR POINTER : PTR);                                   *
                 *                                                                 *
                 *  INPUT:  1) POINTER IS A TYPED POINTER                          *
                 *                                                                 *
                 *  OUTPUT:  none                                                  *
                 *                                                                 *
                 *******************************************************************
                                  GLOBAL DISPOSE
00009C 60FE       DISPOSE         BRA DISPOSE
00009E                            DS.W 1

                 *******************************************************************
                 *                                                                 *
                 *  MARK (VAR POINTER : PTR);                                      *
                 *                                                                 *
                 *  INPUT:  1) POINTER IS A TYPED POINTER                          *
                 *                                                                 *
                 *  OUTPUT:  none                                                  *
                 *                                                                 *
                 *******************************************************************
                                  GLOBAL MARK
0000A0 60FE       MARK            BRA MARK
0000A2                            DS.W 1

                 *******************************************************************
                 *                                                                 *
                 *  RELEASE (VAR POINTER : PTR);                                   *
                 *                                                                 *
                 *  INPUT:  1) POINTER IS A TYPED POINTER                          *
                 *                                                                 *
                 *  OUTPUT:  none                                                  *
                 *                                                                 *
                 *******************************************************************
                                  GLOBAL RELEASE
0000A4 60FE       RELEASE         BRA RELEASE
0000A6                            DS.W 1

                 *******************************************************************
                 *                                                                 *
                 *  NEW_IT (SIZE : INT; VAR BLOCK_PTR : PTR);                      *
                 *                                                                 *
                 *  INPUT:  1) SIZE IS THE SIZE IN BYTES                           *
                 *       :  2) BLOCK_PTR IS THE POINTER TO THE BLOCK               *
                 *                                                                 *
                 *  OUTPUT:  none                                                  *
                 *                                                                 *
                 *******************************************************************
                                  GLOBAL NEW_IT
0000A8 60FE       NEW_IT          BRA NEW_IT
0000AA                            DS.W 1

                 *******************************************************************
                 *                                                                 *
```

```
                  * DISPOSE_IT (SIZE : INT; VAR BLOCK_PTR : PTR);                        *
                  *                                                                      *
                  *  INPUT:  1) SIZE IS THE SIZE IN BYTES                                *
                  *          2) BLOCK_PTR IS THE POINTER TO THE BLOCK                    *
                  *                                                                      *
                  *  OUTPUT:  none                                                       *
                  *                                                                      *
                  ************************************************************************
                                   GLOBAL DISPOSE_IT
0000AC 60FE       DISPOSE_IT       BRA DISPOSE_IT
0000AE                             DS.W 1

                  ************************************************************************
                  *                                                                      *
                  *  CHECK_POOL;                                                         *
                  *                                                                      *
                  *  INPUT: none                                                         *
                  *                                                                      *
                  *  OUTPUT:  none                                                       *
                  *                                                                      *
                  ************************************************************************
                                   GLOBAL CHECK_POOL
0000B0 60FE       CHECK_POOL       BRA CHECK_POOL
0000B2                             DS.W 1

                                   END

Errors=    0
                  "68000"

                                   EXTERNAL P_CLOSE
000000 6000 0000                   BRA P_CLOSE

                                   EXTERNAL P_CREATE
000004 6000 0000                   BRA P_CREATE

                                   EXTERNAL P_DELETE
000008 6000 0000                   BRA P_DELETE

                                   EXTERNAL P_OPEN
00000C 6000 0000                   BRA P_OPEN

                                   EXTERNAL P_ADVANCE
000010 6000 0000                   BRA P_ADVANCE

                                   EXTERNAL P_BACKUP
000014 6000 0000                   BRA P_BACKUP

                                   EXTERNAL P_POSITION
000018 6000 0000                   BRA P_POSITION

                                   EXTERNAL P_READ
00001C 6000 0000                   BRA P_READ

                                   EXTERNAL P_READBACKWARD
000020 6000 0000                   BRA P_READBACKWARD

                                   EXTERNAL READ_DCB_ADDR
000024 6000 0000                   BRA READ_DCB_ADDR

                                   EXTERNAL P_WRITE
000028 6000 0000                   BRA P_WRITE

                                   EXTERNAL P_FILE_ERR
00002C 6000 0000                   BRA P_FILE_ERR

                                   EXTERNAL P_READRECNUM
000030 6000 0000                   BRA P_READRECNUM

                                   EXTERNAL P_WRITEBACKWARD
000034 6000 0000                   BRA P_WRITEBACKWARD

                                   EXTERNAL DEFINE_IMB
000038 6000 0000                   BRA DEFINE_IMB
```

```
                      *    EXTERNAL DUMMY_1
00003C 6000 0000           BRA OUTIT

                           EXTERNAL P_MESSAGE
000040 6000 0000           BRA P_MESSAGE

                           EXTERNAL READ_MEM
000044 6000 0000           BRA READ_MEM

                           EXTERNAL WRITE_MEM
000048 6000 0000           BRA WRITE_MEM

                           EXTERNAL LOAD_ABS_FILE
00004C 6000 0000           BRA LOAD_ABS_FILE

                           EXTERNAL O_APPLY_BREAK
000050 6000 0000           BRA O_APPLY_BREAK

                           EXTERNAL APPLY_RESET
000054 6000 0000           BRA APPLY_RESET

                           EXTERNAL RUN
000058 6000 0000           BRA RUN

                      *    EXTERNAL DUMMY_2
00005C 6000 0000           BRA OUTIT

                      *    EXTERNAL DUMMY_3
000060 6000 0000           BRA OUTIT

                           EXTERNAL EMUL_MSG
000064 6000 0000           BRA EMUL_MSG

                      *    EXTERNAL DUMMY_4
000068 6000 0000           BRA OUTIT

                           EXTERNAL READ_REG
00006C 6000 0000           BRA READ_REG

                           EXTERNAL EMUL_STATUS
000070 6000 0000           BRA EMUL_STATUS

                           EXTERNAL GET_SEG_REGS
000074 6000 0000           BRA GET_SEG_REGS

                      *    EXTERNAL DUMMY_5
000078 6000 0000           BRA OUTIT

                      *    EXTERNAL DUMMY_6
00007C 6000 0000           BRA OUTIT

                           EXTERNAL C_AREA_ADDR
000080 6000 0000           BRA C_AREA_ADDR

                           EXTERNAL BPC_READ
000084 6000 0000           BRA BPC_READ

                           EXTERNAL BPC_WRITE
000088 6000 0000           BRA BPC_WRITE

                           EXTERNAL P_FORMATTER
00008C 6000 0000           BRA P_FORMATTER

                           EXTERNAL P_CALENDAR
000090 6000 0000           BRA P_CALENDAR

                           EXTERNAL OUTIT
000094 6000 0000           BRA OUTIT

                           EXTERNAL NEW
000098 6000 0000           BRA NEW

                           EXTERNAL DISPOSE
```

```
00009C 6000 0000              BRA DISPOSE

                              EXTERNAL MARK
0000A0 6000 0000              BRA MARK

                              EXTERNAL RELEASE
0000A4 6000 0000              BRA RELEASE

                              EXTERNAL NEW_IT
0000A8 6000 0000              BRA NEW_IT

                              EXTERNAL DISPOSE_IT
0000AC 6000 0000              BRA DISPOSE_IT

                              EXTERNAL CHECK_POOL
0000B0 6000 0000              BRA CHECK_POOL

                              END

Errors=    0

00000000  1  "68000" PREPROCESS
00000000  1
00000000  1  PROGRAM MESS_68K_;
00000000  1  {*************************************************************************}
00000000  1  {                                                                         }
00000000  1  { 68000 MESSAGE HANDLER                                                   }
00000000  1  {                                                                         }
00000000  1  {*************************************************************************}
00000000  1
00000000  1  $EXTENSIONS ON$
00000000  1  $WARN OFF$
00000000  1
00000000  1  CONST
00000000  1       BUFFER_POOL_SIZE = 08000H;
00000000  1       BUFFER_POOL_ADDR = 08000H;
00000000  1       RESPONSE_CHAN = 07D000H;    { <==================================== }
00000000  1       WAITING_CHAN = 07D800H;     { <==================================== }
00000000  1       REQUEST_PRI = -99;
00000000  1
00000000  1  TYPE
00000000  1      INT = SIGNED_16;
00000000  1      INT_PTR = ^ INT;
00000000  1      HEAP_TYPE = RECORD
00000000  2                  START : INTEGER;
00000000  2                  LENGTH : INTEGER;
00000000  1                  END;
00000000  1      HEAP_ARRAY = ARRAY[0..10] OF HEAP_TYPE;
00000000  1  #INCLUDE ICDS_68K:SODAME
00000000  1
00000000  1  VAR
00000000  1  $GLOBVAR+$
00000000  1      STACK_AREA : ARRAY[0..63] OF INT;
00000080  1      STACK_ : INT;
00000082  1      CDS_SEMAPHORE : INT;
00000084  1      PARM_BLOCK_ADD : INTEGER;
00000088  1  $GLOBVAR-$
00000088  1  $EXTVAR+$
00000088  1      CDS : CDS_TYPE;
00000088  1      PARM_BLOCK : INT;
00000088  1  $EXTVAR-$
00000000  1
00000000  1  PROCEDURE INITHEAP(NUMBER : INT; VAR POOL_ARRAY : HEAP_ARRAY); EXTERNAL;
00000000  1  PROCEDURE SET_PRI_(PRI : INT); EXTERNAL;
00000000  1  PROCEDURE SLEEP_ (CHAN : INTEGER; PRI : INT); EXTERNAL;
00000000  1  PROCEDURE WAKEUP_ (CHAN : INTEGER); EXTERNAL;
00000000  1  PROCEDURE EXIT_; EXTERNAL;
00000000  1  PROCEDURE P(VAR S : INT); EXTERNAL;
00000000  1  PROCEDURE V(VAR S : INT); EXTERNAL;
00000000  1
00000000  1  PROCEDURE INIT_MEMORY;
00000000  2  VAR
00000000  2      POOL_ARRAY : HEAP_ARRAY;
00000004  2  BEGIN
```

```
00000004  2  POOL_ARRAY[0].START  :=  8000H;
0000000C  2  POOL_ARRAY[0].LENGTH :=  7FF8H;
00000018  2  POOL_ARRAY[1].START  := 10000H;
00000020  2  POOL_ARRAY[1].LENGTH :=  7FF8H;
0000002C  2  (
0000002C  2  POOL_ARRAY[2].START  := 26800H;
0000002C  2  POOL_ARRAY[2].LENGTH :=  1800H;
0000002C  2  )
0000002C  2  INITHEAP(2,POOL_ARRAY);
0000003A  2  END;
00000000  1
00000000  1  $GLOBPROC+$
00000000  1
00000000  1  (*************************************************************************)
00000000  1  (                                                                         )
00000000  1  (                                                                         )
00000000  1  (*************************************************************************)
00000000  1  PROCEDURE PLACE_REQUEST(REQUEST : INT; REQUEST_PTR : INTEGER);
00000042  2  BEGIN
00000042  2  IF CDS.REQUEST_TYPE = INT(EMPTY) THEN
0000004E  2      BEGIN
0000004E  2      CDS.REQUEST_TYPE := REQUEST;
00000054  2      CDS.POLL_FLAG := 0;
00000058  2      CDS.INT_BPC_HANDSHAKE := 1;
0000005E  2      (set BPC interrupt)
0000005E  2      WHILE CDS.INT_BPC_HANDSHAKE = 1 DO ;
0000006C  2      (clear BPC interrupt)
0000006C  2      CDS.INT_BPC_HANDSHAKE := 3;
00000072  2      IF CDS.POLL_FLAG = 2 THEN
0000007E  2           SLEEP_(RESPONSE_CHAN,REQUEST_PRI)
00000092  2      ELSE BEGIN
00000092  2           WHILE CDS.INT_68K_HANDSHAKE = 0 DO ;
0000009C  2           CDS.INT_68K_HANDSHAKE := 2;
000000A4  2           WHILE CDS.INT_68K_HANDSHAKE = 2 DO ;
000000B4  2           CDS.INT_68K_HANDSHAKE := 0;
000000B8  2           END;
000000B8  2      CDS.REQUEST_TYPE := INT(EMPTY);
000000BE  2      END;
000000BE  2  END;
000000CE  1
000000CE  1  (*************************************************************************)
000000CE  1  (                                                                         )
000000CE  1  (  This routine is responsible for initializing the various data        )
000000CE  1  (  structures needed by the request/response routines and the           )
000000CE  1  (  68000/BPC message handler.                                            )
000000CE  1  (  These include:                                                        )
000000CE  1  (     1. The buffer pool.                                                )
000000CE  1  (     2. The request common data structure.                              )
000000CE  1  (     3. The response common data structure.                             )
000000CE  1  (                                                                         )
000000CE  1  (*************************************************************************)
000000CE  1  BEGIN
000000CE  1  INIT_MEMORY;
000000D2  1  CDS.REQUEST_TYPE := INT(IN_HERE);
000000D8  1  CDS.PANIC_FLAG := -1;
000000DE  1  CDS_SEMAPHORE := 0;
000000E2  1  PARM_BLOCK_ADD := INTEGER(ADDR(CDS.PARAMATERS));
000000EA  1  EXIT_;
000000EE  1  END
00000000  1  .

End of compilation, number of errors=    0

00000000  1  "68000" PREPROCESS
00000000  1
00000000  1  PROGRAM REQUEST_;
00000000  1  (*************************************************************************)
00000000  1  (                                                                         )
00000000  1  ( MESSAGE HANDLER REQUEST INTERFACE ROUTINES                              )
00000000  1  (                                                                         )
00000000  1  (*************************************************************************)
00000000  1
00000000  1  $EXTENSIONS ON$
00000000  1  $WARN OFF$
```

```
00000000  1
00000000  1  CONST
00000000  1       MAXMAP = 49;
00000000  1       REQUEST_PRI = -99;         { {==================================== }
00000000  1
00000000  1  TYPE
00000000  1      INT = SIGNED_16;
00000000  1      PTR = ^ INT;
00000000  1      VECTOR0_7 = ARRAY[0..7] OF INT;
00000000  1      VECTOR0_7_I = ARRAY[0..7] OF INTEGER;
00000000  1      BUFF_TYPE = VECTOR0_7;
00000000  1      BUFF_PTR = ^ VECTOR0_7;
00000000  1      DOUBLE_WORD = RECORD
00000000  2                  MSW : INT;
00000000  2                  LSW : INT;
00000000  1                  END;
00000000  1  #INCLUDE ICDS_68K:SODANE
00000000  1
00000000  1  VAR
00000000  1  $EXTVAR+$
00000000  1      CDS_SEMAPHORE : INT;
00000000  1      PARM_BLOCK_ADD : INTEGER;
00000000  1  $EXTVAR-$
00000000  1
00000000  1  PROCEDURE SET_PRI_ (PRI : INT); EXTERNAL;
00000000  1  PROCEDURE READ_PRI_ (VAR PRI : INT); EXTERNAL;
00000000  1  PROCEDURE SLEEP_ (CHAN : INTEGER; PRI : INT); EXTERNAL;
00000000  1  PROCEDURE WAKEUP_ (CHAN : INTEGER); EXTERNAL;
00000000  1  PROCEDURE PLACE_REQUEST(REQUEST : INT; REQUEST_PTR : INTEGER); EXTERNAL;
00000000  1  PROCEDURE P(VAR S : INT); EXTERNAL;
00000000  1  PROCEDURE V(VAR S : INT); EXTERNAL;
00000000  1
00000000  1  PROCEDURE INIT(VAR PRI : INT; VAR PTR : INTEGER);
00000004  2  BEGIN
00000004  2  READ_PRI_(PRI);
00000010  2  SET_PRI_(REQUEST_PRI);
0000001A  2  P(CDS_SEMAPHORE);
00000024  2  PTR := PARM_BLOCK_ADD;
0000002C  2  END;
00000000  1
00000000  1  PROCEDURE GOBACK(VAR PRI : INT; VAR PTR : INTEGER);
00000034  2  BEGIN
00000034  2  V(CDS_SEMAPHORE);
0000003E  2  SET_PRI_(PRI);
0000004A  2  END;
00000000  1
00000000  1  PROCEDURE FLIP_WORDS(VAR VALUE : INTEGER);
00000000  2  VAR
00000000  2      V_TEMP : DOUBLE_WORD;
00000004  2      TEMP : INT;
00000052  2  BEGIN
00000052  2  V_TEMP := DOUBLE_WORD(VALUE);
0000005A  2  TEMP := V_TEMP.LSW;
00000060  2  V_TEMP.LSW := V_TEMP.MSW;
00000066  2  V_TEMP.MSW := TEMP;
0000006C  2  VALUE := INTEGER(V_TEMP);
00000074  2  END;
00000000  1
00000000  1  $GLOBPROC+$
00000000  1  (*
00000000  1  PROCEDURE OUTIT (LETTER : INT; VALUE : INT; BASE : INT); FORWARD;
00000000  1  *)
00000000  1  {*************************************************************************}
00000000  1  {                                                                         }
00000000  1  {     P_CLOSE ( DCB, FMGR_CODE );                                         }
00000000  1  {                                                                         }
00000000  1  {*************************************************************************}
00000000  1  PROCEDURE P_CLOSE (VAR DCB : INT; VAR FMGR_CODE : INT);
00000000  2
00000000  2  TYPE
00000000  2      CLOSE_TYPE = RECORD
00000000  3                  DCB : INT;
00000000  3                  FMGR_CODE : INT;
00000000  2                  END;
```

```
00000000  2      CLOSE_PTR = ^ CLOSE_TYPE;
00000000  2
00000000  2  VAR
00000000  2      CLOSE : CLOSE_PTR;
00000004  2      PRI : INT;
0000007C  2
0000007C  2  BEGIN
0000007C  2  INIT(PRI,INTEGER(CLOSE));
0000008A  2  CLOSE^.DCB := DCB;
00000094  2  PLACE_REQUEST(INT(CLOSE_REQUEST),INTEGER(CLOSE));
000000A2  2  FMGR_CODE := CLOSE^.FMGR_CODE;
000000AE  2  GOBACK(PRI,INTEGER(CLOSE));
000000BC  2  END;
00000000  1
00000000  1  {***************************************************************************}
00000000  1  {                                                                           }
00000000  1  {    P_CREATE ( FNAME, FTYPE, DISC, DCB, BSZ, FMGR_CODE );                  }
00000000  1  {                                                                           }
00000000  1  {***************************************************************************}
00000000  1  PROCEDURE P_CREATE (VAR FNAME : VECTORO_7; FTYPE, DISC : INT;
00000000  2                     VAR DCB : INT; BUFSIZE : INT;
00000000  2                     VAR FMGR_CODE : INT);
00000000  2
00000000  2  TYPE
00000000  2      CREATE_TYPE = RECORD
00000000  3                  FNAME : VECTORO_7;
00000000  3                  FTYPE : INT;
00000000  3                  DISC : INT;
00000000  3                  DCB : INT;
00000000  3                  BUFSIZE : INT;
00000000  3                  FMGR_CODE : INT;
00000000  2                  END;
00000000  2      CREATE_PTR = ^ CREATE_TYPE;
00000000  2
00000000  2  VAR
00000000  2      CREATE : CREATE_PTR;
00000004  2      PRI : INT;
000000C4  2
000000C4  2  BEGIN
000000C4  2  INIT(PRI,INTEGER(CREATE));
000000D2  2  CREATE^.FNAME := FNAME;
000000E2  2  CREATE^.FTYPE := FTYPE;
000000EC  2  CREATE^.DISC := DISC;
000000F6  2  CREATE^.DCB := DCB;
00000102  2  CREATE^.BUFSIZE := BUFSIZE;
0000010C  2  PLACE_REQUEST(INT(CREATE_REQUEST),INTEGER(CREATE));
0000011A  2  DCB := CREATE^.DCB;
00000126  2  FMGR_CODE := CREATE^.FMGR_CODE;
00000132  2  GOBACK(PRI,INTEGER(CREATE));
00000140  2  END;
00000000  1
00000000  1  {***************************************************************************}
00000000  1  {                                                                           }
00000000  1  {    P_DELETE ( FNAME, FTYPE, DISC, DCB, FMGR_CODE );                       }
00000000  1  {                                                                           }
00000000  1  {***************************************************************************}
00000000  1  PROCEDURE P_DELETE (VAR FNAME : VECTORO_7; FTYPE, DISC : INT;
00000000  2                     VAR DCB : INT; VAR FMGR_CODE : INT);
00000000  2
00000000  2  TYPE
00000000  2      DELETE_TYPE = RECORD
00000000  3                  FNAME : VECTORO_7;
00000000  3                  FTYPE : INT;
00000000  3                  DISC : INT;
00000000  3                  DCB : INT;
00000000  3                  FMGR_CODE : INT;
00000000  2                  END;
00000000  2      DELETE_PTR = ^ DELETE_TYPE;
00000000  2
00000000  2  VAR
00000000  2      DELETE : DELETE_PTR;
00000004  2      PRI : INT;
00000148  2
00000148  2  BEGIN
```

```
00000148  2  INIT(PRI,INTEGER(DELETE));
00000156  2  DELETE^.FNAME := FNAME;
00000166  2  DELETE^.FTYPE := FTYPE;
00000170  2  DELETE^.DISC := DISC;
0000017A  2  PLACE_REQUEST(INT(DELETE_REQUEST),INTEGER(DELETE));
00000188  2  DCB := DELETE^.DCB;
00000194  2  FMGR_CODE := DELETE^.FMGR_CODE;
000001A0  2  GOBACK(PRI,INTEGER(DELETE));
000001AE  2  END;
00000000  1
00000000  1  {*************************************************************************}
00000000  1  {                                                                         }
00000000  1  {    P_OPEN ( FNAME, FTYPE, DISC, DCB, BSZ, FMGR_CODE );                  }
00000000  1  {                                                                         }
00000000  1  {*************************************************************************}
00000000  1  PROCEDURE P_OPEN (VAR FNAME : VECTOR0_7; FTYPE, DISC : INT;
00000000  2                   VAR DCB : INT; BUFSIZE : INT;
00000000  2                   VAR FMGR_CODE : INT);
00000000  2
00000000  2  TYPE
00000000  2      OPEN_TYPE = RECORD
00000000  3                  FNAME : VECTOR0_7;
00000000  3                  FTYPE : INT;
00000000  3                  DISC : INT;
00000000  3                  DCB : INT;
00000000  3                  BUFSIZE : INT;
00000000  3                  FMGR_CODE : INT;
00000000  2                  END;
00000000  2      OPEN_PTR = ^ OPEN_TYPE;
00000000  2
00000000  2  VAR
00000000  2      OPEN : OPEN_PTR;
00000004  2      PRI : INT;
000001B6  2
000001B6  2  BEGIN
000001B6  2  INIT(PRI,INTEGER(OPEN));
000001C4  2  OPEN^.FNAME := FNAME;
000001D4  2  OPEN^.FTYPE := FTYPE;
000001DE  2  OPEN^.DISC := DISC;
000001E8  2  OPEN^.DCB := DCB;
000001F4  2  OPEN^.BUFSIZE := BUFSIZE;
000001FE  2  PLACE_REQUEST(INT(OPEN_REQUEST),INTEGER(OPEN));
0000020C  2  DCB := OPEN^.DCB;
00000218  2  FMGR_CODE := OPEN^.FMGR_CODE;
00000224  2  GOBACK(PRI,INTEGER(OPEN));
00000232  2  END;
00000000  1
00000000  1  {*************************************************************************}
00000000  1  {                                                                         }
00000000  1  {    P_ADVANCE ( DCB, NREC, FMGR_CODE );                                  }
00000000  1  {                                                                         }
00000000  1  {*************************************************************************}
00000000  1  PROCEDURE P_ADVANCE (VAR DCB : INT; NREC : INT;
00000000  2                      VAR FMGR_CODE : INT);
00000000  2
00000000  2  TYPE
00000000  2      ADVANCE_TYPE = RECORD
00000000  3                  DCB : INT;
00000000  3                  NREC : INT;
00000000  3                  FMGR_CODE : INT;
00000000  2                  END;
00000000  2      ADVANCE_PTR = ^ ADVANCE_TYPE;
00000000  2
00000000  2  VAR
00000000  2      ADVANCE : ADVANCE_PTR;
00000004  2      PRI : INT;
0000023A  2
0000023A  2  BEGIN
0000023A  2  INIT(PRI,INTEGER(ADVANCE));
00000248  2  ADVANCE^.DCB := DCB;
00000252  2  ADVANCE^.NREC := NREC;
0000025C  2  PLACE_REQUEST(INT(ADVANCE_REQUEST),INTEGER(ADVANCE));
0000026A  2  FMGR_CODE := ADVANCE^.FMGR_CODE;
```

```
00000276  2  GOBACK(PRI,INTEGER(ADVANCE));
00000284  2  END;
00000000  1
00000000  1  {*************************************************************************}
00000000  1  {                                                                         }
00000000  1  {    P_BACKUP ( DCB, NREC, FMGR_CODE );                                   }
00000000  1  {                                                                         }
00000000  1  {*************************************************************************}
00000000  1  PROCEDURE P_BACKUP (VAR DCB : INT; NREC : INT;
00000000  2                      VAR FMGR_CODE : INT);
00000000  2
00000000  2  TYPE
00000000  2      BACKUP_TYPE = RECORD
00000000  3                  DCB : INT;
00000000  3                  NREC : INT;
00000000  3                  FMGR_CODE : INT;
00000000  2                  END;
00000000  2      BACKUP_PTR = ^ BACKUP_TYPE;
00000000  2
00000000  2  VAR
00000000  2      BACKUP : BACKUP_PTR;
00000004  2      PRI : INT;
0000028C  2
0000028C  2  BEGIN
0000028C  2  INIT(PRI,INTEGER(BACKUP));
0000029A  2  BACKUP^.DCB := DCB;
000002A4  2  BACKUP^.NREC := NREC;
000002AE  2  PLACE_REQUEST(INT(BACKUP_REQUEST),INTEGER(BACKUP));
000002BC  2  FMGR_CODE := BACKUP^.FMGR_CODE;
000002C8  2  GOBACK(PRI,INTEGER(BACKUP));
000002D6  2  END;
00000000  1
00000000  1  {*************************************************************************}
00000000  1  {                                                                         }
00000000  1  {    P_POSITION ( DCB, RECN, FMGR_CODE );                                 }
00000000  1  {                                                                         }
00000000  1  {*************************************************************************}
00000000  1  PROCEDURE P_POSITION (VAR DCB : INT; RECN : INT;
00000000  2                      VAR FMGR_CODE : INT);
00000000  2
00000000  2  TYPE
00000000  2      POSITION_TYPE = RECORD
00000000  3                  DCB : INT;
00000000  3                  RECN : INT;
00000000  3                  FMGR_CODE : INT;
00000000  2                  END;
00000000  2      POSITION_PTR = ^ POSITION_TYPE;
00000000  2
00000000  2  VAR
00000000  2      POSITION : POSITION_PTR;
00000004  2      PRI : INT;
000002DE  2
000002DE  2  BEGIN
000002DE  2  INIT(PRI,INTEGER(POSITION));
000002EC  2  POSITION^.DCB := DCB;
000002F6  2  POSITION^.RECN := RECN;
00000300  2  PLACE_REQUEST(INT(POSITION_REQUEST),INTEGER(POSITION));
0000030E  2  FMGR_CODE := POSITION^.FMGR_CODE;
0000031A  2  GOBACK(PRI,INTEGER(POSITION));
00000328  2  END;
00000000  1
00000000  1  {*************************************************************************}
00000000  1  {                                                                         }
00000000  1  {    P_READ ( DCB, RBUFF, LENGTH, FMGR_CODE );                            }
00000000  1  {                                                                         }
00000000  1  {*************************************************************************}
00000000  1  PROCEDURE P_READ (VAR DCB : INT; VAR RBUFF : BUFF_TYPE; LENGTH : INT;
00000000  2                   VAR FMGR_CODE : INT);
00000000  2
00000000  2  TYPE
00000000  2      READ_TYPE = RECORD
00000000  3                  DCB : INT;
00000000  3                  RBUFF : INTEGER;
00000000  3                  LENGTH : INT;
```

```
00000000  3              FMGR_CODE : INT;
00000000  2              END;
00000000  2     READ_PTR = ^ READ_TYPE;
00000000  2
00000000  2  VAR
00000000  2     READ : READ_PTR;
00000004  2     PRI : INT;
00000006  2     TPTR : BUFF_PTR;
0000000A  2     TLEN : INT;
00000330  2
00000330  2  BEGIN
00000330  2  INIT(PRI,INTEGER(READ));
0000033E  2  READ^.RBUFF := INTEGER(ADDR(RBUFF));
0000034A  2  READ^.DCB := DCB;
00000354  2  READ^.LENGTH := LENGTH;
0000035E  2  PLACE_REQUEST(INT(READ_REQUEST),INTEGER(READ));
0000036C  2  FMGR_CODE := READ^.FMGR_CODE;
00000378  2  GOBACK(PRI,INTEGER(READ));
00000386  2  END;
00000000  1
00000000  1  {*************************************************************************}
00000000  1  {                                                                         }
00000000  1  {    P_READBACKWARD ( DCB, RBUFF, LENGTH, FMGR_CODE );                    }
00000000  1  {                                                                         }
00000000  1  {*************************************************************************}
00000000  1  PROCEDURE P_READBACKWARD (VAR DCB : INT; VAR RBUFF : BUFF_TYPE; LENGTH : INT;
00000000  2                   VAR FMGR_CODE : INT);
00000000  2
00000000  2  TYPE
00000000  2     READBACKWARD_TYPE = RECORD
00000000  3              DCB : INT;
00000000  3              RBUFF : INTEGER;
00000000  3              LENGTH : INT;
00000000  3              FMGR_CODE : INT;
00000000  2              END;
00000000  2     READBACKWARD_PTR = ^ READBACKWARD_TYPE;
00000000  2
00000000  2  VAR
00000000  2     READBACKWARD : READBACKWARD_PTR;
00000004  2     PRI : INT;
00000006  2     TPTR_S : BUFF_PTR;
0000000A  2     TPTR_D : BUFF_PTR;
0000000E  2     TLEN : INT;
0000038E  2
0000038E  2  BEGIN
0000038E  2  INIT(PRI,INTEGER(READBACKWARD));
0000039C  2  READBACKWARD^.RBUFF := INTEGER(ADDR(RBUFF));
000003A8  2  READBACKWARD^.DCB := DCB;
000003B2  2  READBACKWARD^.LENGTH := LENGTH;
000003BC  2  PLACE_REQUEST(INT(READBACKWARD_REQUEST),INTEGER(READBACKWARD));
000003CA  2  FMGR_CODE := READBACKWARD^.FMGR_CODE;
000003D6  2  GOBACK(PRI,INTEGER(READBACKWARD));
000003E4  2  END;
00000000  1
00000000  1  {*************************************************************************}
00000000  1  {                                                                         }
00000000  1  {    READ_DCB_ADDR ( DCB, ADDRESS, FMGR_CODE );                           }
00000000  1  {                                                                         }
00000000  1  {*************************************************************************}
00000000  1  PROCEDURE READ_DCB_ADDR (VAR DCB : INT; VAR ADDRESS : INT; VAR FMGR_CODE : INT);
00000000  2
00000000  2  TYPE
00000000  2     READ_DCB_ADDR_TYPE = RECORD
00000000  3              DCB : INT;
00000000  3              ADDRESS : INT;
00000000  3              FMGR_CODE : INT;
00000000  2              END;
00000000  2     READ_DCB_ADDR_PTR = ^ READ_DCB_ADDR_TYPE;
00000000  2
00000000  2  VAR
00000000  2     READ_DCB_ADDR : READ_DCB_ADDR_PTR;
00000004  2     PRI : INT;
000003EC  2
000003EC  2  BEGIN
```

```
000003EC  2  INIT(PRI,INTEGER(READ_DCB_ADDR));
000003FA  2  READ_DCB_ADDR^.DCB := DCB;
00000404  2  PLACE_REQUEST(INT(READ_DCB_ADDR_REQUEST),INTEGER(READ_DCB_ADDR));
00000412  2  ADDRESS := READ_DCB_ADDR^.ADDRESS;
0000041E  2  FMGR_CODE := READ_DCB_ADDR^.FMGR_CODE;
0000042A  2  GOBACK(PRI,INTEGER(READ_DCB_ADDR));
00000438  2  END;
00000000  1
00000000  1  {***************************************************************************}
00000000  1  {                                                                           }
00000000  1  {     P_WRITE ( DCB, RBUFF, FMGR_CODE );                                    }
00000000  1  {                                                                           }
00000000  1  {***************************************************************************}
00000000  1  PROCEDURE P_WRITE (VAR DCB : INT; VAR RBUFF : BUFF_TYPE;
00000000  2                     VAR FMGR_CODE : INT);
00000000  2
00000000  2  TYPE
00000000  2      WRITE_TYPE = RECORD
00000000  3                   DCB : INT;
00000000  3                   RBUFF : INTEGER;
00000000  3                   FMGR_CODE : INT;
00000000  2                   END;
00000000  2      WRITE_PTR = ^ WRITE_TYPE;
00000000  2
00000000  2  VAR
00000000  2      WRITE : WRITE_PTR;
00000004  2      LENGTH : INT;
00000006  2      PRI : INT;
00000008  2      TPTR : BUFF_PTR;
00000440  2
00000440  2  BEGIN
00000440  2  INIT(PRI,INTEGER(WRITE));
0000044E  2  WRITE^.RBUFF := INTEGER(ADDR(RBUFF));
0000045A  2  WRITE^.DCB := DCB;
00000464  2  PLACE_REQUEST(INT(WRITE_REQUEST),INTEGER(WRITE));
00000472  2  FMGR_CODE := WRITE^.FMGR_CODE;
0000047E  2  GOBACK(PRI.INTEGER(WRITE));
0000048C  2  END;
00000000  1
00000000  1  {***************************************************************************}
00000000  1  {                                                                           }
00000000  1  {     P_FILE_ERR ( DCB, FMGR_CODE );                                        }
00000000  1  {                                                                           }
00000000  1  {***************************************************************************}
00000000  1  PROCEDURE P_FILE_ERR (VAR DCB : INT; FMGR_CODE : INT);
00000000  2
00000000  2  TYPE
00000000  2      FILE_ERR_TYPE = RECORD
00000000  3                   DCB : INT;
00000000  3                   FMGR_CODE : INT;
00000000  2                   END;
00000000  2      FILE_ERR_PTR = ^ FILE_ERR_TYPE;
00000000  2
00000000  2  VAR
00000000  2      FILE_ERR : FILE_ERR_PTR;
00000004  2      PRI : INT;
00000494  2
00000494  2  BEGIN
00000494  2  INIT(PRI,INTEGER(FILE_ERR));
000004A2  2  FILE_ERR^.DCB := DCB;
000004AC  2  FILE_ERR^.FMGR_CODE := FMGR_CODE;
000004B6  2  PLACE_REQUEST(INT(FILE_ERR_REQUEST),INTEGER(FILE_ERR));
000004C4  2  GODACK(PRI,INTEGER(FILE_ERR));
000004D2  2  END;
00000000  1
00000000  1  {***************************************************************************}
00000000  1  {                                                                           }
00000000  1  {     P_READRECNUM ( DCB, REC_NUM, FMGR_CODE );                             }
00000000  1  {                                                                           }
00000000  1  {***************************************************************************}
00000000  1  PROCEDURE P_READRECNUM (VAR DCB, REC_NUM, FMGR_CODE : INT);
00000000  2
00000000  2  TYPE
```

```
00000000 2      READ_REC_TYPE = RECORD
00000000 3                DCB : INT;
00000000 3                REC_NUM : INT;
00000000 3                FNGR_CODE : INT;
00000000 2                END;
00000000 2      READ_REC_PTR = ^ READ_REC_TYPE;
00000000 2
00000000 2  VAR
00000000 2      READ_REC : READ_REC_PTR;
00000004 2      PRI : INT;
000004DA 2
000004DA 2  BEGIN
000004DA 2  INIT(PRI,INTEGER(READ_REC));
000004E8 2  READ_REC^.DCB := DCB;
000004F2 2  PLACE_REQUEST(INT(READ_REC_NUM_REQUEST),INTEGER(READ_REC));
00000500 2  REC_NUM := READ_REC^.REC_NUM;
0000050C 2  FNGR_CODE := READ_REC^.FNGR_CODE;
00000518 2  GOBACK(PRI,INTEGER(READ_REC));
00000526 2  END;
00000000 1
00000000 1  {***************************************************************************}
00000000 1  {                                                                           }
00000000 1  {    P_WRITEBACKWARD ( DCB, RBUFF, FNGR_CODE );                             }
00000000 1  {                                                                           }
00000000 1  {***************************************************************************}
00000000 1  PROCEDURE P_WRITEBACKWARD (VAR DCB : INT; VAR RBUFF : BUFF_TYPE;
00000000 2                              VAR FNGR_CODE : INT);
00000000 2
00000000 2  TYPE
00000000 2      WRITEBACKWARD_TYPE = RECORD
00000000 3                DCB : INT;
00000000 3                RBUFF : INTEGER;
00000000 3                FNGR_CODE : INT;
00000000 2                END;
00000000 2      WRITEBACKWARD_PTR = ^ WRITEBACKWARD_TYPE;
00000000 2
00000000 2  VAR
00000000 2      WRITEBACKWARD : WRITEBACKWARD_PTR;
00000004 2      LENGTH : INT;
00000006 2      PRI : INT;
00000008 2      TPTR : BUFF_PTR;
0000052E 2
0000052E 2  BEGIN
0000052E 2  INIT(PRI,INTEGER(WRITEBACKWARD));
0000053C 2  WRITEBACKWARD^.RBUFF := INTEGER(ADDR(RBUFF));
00000548 2  WRITEBACKWARD^.DCB := DCB;
00000552 2  PLACE_REQUEST(INT(WRITEBACKWARD_REQUEST),INTEGER(WRITEBACKWARD));
00000560 2  FNGR_CODE := WRITEBACKWARD^.FNGR_CODE;
0000056C 2  GOBACK(PRI,INTEGER(WRITEBACKWARD));
0000057A 2  END;
00000000 1
00000000 1  {***************************************************************************}
00000000 1  {                                                                           }
00000000 1  {    DEFINE_IMB (ACTION, REQUEST, RETURN_CODE );                            }
00000000 1  {                                                                           }
00000000 1  {***************************************************************************}
00000000 1  PROCEDURE DEFINE_IMB (ACTION, REQUEST : INT; VAR RETURN_CODE : INT);
00000000 2
00000000 2  TYPE
00000000 2      DEF_IMB_TYPE = RECORD
00000000 3                ACTION : INT;
00000000 3                REQUEST : INT;
00000000 3                RETURN_CODE : INT;
00000000 2                END;
00000000 2      DEF_IMB_PTR = ^ DEF_IMB_TYPE;
00000000 2
00000000 2  VAR
00000000 2      DEF_IMB : DEF_IMB_PTR;
00000004 2      PRI : INT;
00000582 2
00000582 2  BEGIN
00000582 2  INIT(PRI,INTEGER(DEF_IMB));
00000590 2  DEF_IMB^.ACTION := ACTION;
00000598 2  DEF_IMB^.REQUEST := REQUEST;
```

```
000005A2  2  PLACE_REQUEST(INT(DEFINE_IMB_REQUEST),INTEGER(DEF_IMB));
000005B0  2  RETURN_CODE := DEF_IMB^.RETURN_CODE;
000005BC  2  GOBACK(PRI,INTEGER(DEF_IMB));
000005CA  2  END;
00000000  1
00000000  1  {*************************************************************************}
00000000  1  {                                                                         }
00000000  1  {    P_MESSAGE ( MESS_PTR, CODE );                                        }
00000000  1  {                                                                         }
00000000  1  {*************************************************************************}
00000000  1  PROCEDURE P_MESSAGE (MESS_PTR : BUFF_PTR; CODE : INT);
00000000  2
00000000  2  TYPE
00000000  2      MESSAGE_TYPE = RECORD
00000000  3                 MESS_PTR : BUFF_PTR;
00000000  3                 CODE : INT;
00000000  2                 END;
00000000  2      MESSAGE_PTR = ^ MESSAGE_TYPE;
00000000  2
00000000  2  VAR
00000000  2      MESSAGE : MESSAGE_PTR;
00000004  2      LENGTH : INT;
00000006  2      PRI : INT;
000005D2  2
000005D2  2  BEGIN
000005D2  2  INIT(PRI,INTEGER(MESSAGE));
000005E0  2  MESSAGE^.MESS_PTR := MESS_PTR;
000005E8  2  MESSAGE^.CODE := CODE;
000005F2  2  PLACE_REQUEST(INT(MESSAGE_REQUEST),INTEGER(MESSAGE));
00000600  2  GOBACK(PRI,INTEGER(MESSAGE));
0000060E  2  END;
00000000  1
00000000  1  {*************************************************************************}
00000000  1  {                                                                         }
00000000  1  {    READ_MEM ( ADDRESS, COUNT, DATA, ERROR );                            }
00000000  1  {                                                                         }
00000000  1  {*************************************************************************}
00000000  1  PROCEDURE READ_MEM (ADDRESS : INTEGER; COUNT : INT; VAR DATA : INTEGER;
00000000  2                      VAR ERROR : INT);
00000000  2  TYPE
00000000  2      READ_MEM_TYPE = RECORD
00000000  3                 ADDRESS : INTEGER;
00000000  3                 COUNT : INT;
00000000  3                 DATA : INTEGER;
00000000  3                 ERROR : INT;
00000000  2                 END;
00000000  2      READ_MEM_PTR = ^ READ_MEM_TYPE;
00000000  2
00000000  2  VAR
00000000  2      READ_MEM : READ_MEM_PTR;
00000004  2      PRI : INT;
00000006  2      TPTR : BUFF_PTR;
00000616  2
00000616  2  BEGIN
00000616  2  INIT(PRI,INTEGER(READ_MEM));
00000624  2  READ_MEM^.DATA := INTEGER(ADDR(DATA));
00000630  2  READ_MEM^.ADDRESS := ADDRESS;
00000638  2  FLIP_WORDS(READ_MEM^.ADDRESS);
00000644  2  READ_MEM^.COUNT := COUNT;
0000064E  2  PLACE_REQUEST(INT(READ_MEM_REQUEST),INTEGER(READ_MEM));
0000065C  2  ERROR := BYTE(READ_MEM^.ERROR);
00000668  2  GOBACK(PRI,INTEGER(READ_MEM));
00000676  2  END;
00000000  1
00000000  1  {*************************************************************************}
00000000  1  {                                                                         }
00000000  1  {    WRITE_MEM ( ADDRESS, COUNT, DATA, ERROR, TRGMEM );                   }
00000000  1  {                                                                         }
00000000  1  {*************************************************************************}
00000000  1  PROCEDURE WRITE_MEM (ADDRESS : INTEGER; COUNT : INT; VAR DATA : INTEGER;
00000000  2                       VAR ERROR : INT; TRGMEM : INT);
00000000  2  TYPE
00000000  2      WRITE_MEM_TYPE = RECORD
00000000  3                 ADDRESS : INTEGER;
```

```
00000000 3                 COUNT : INT,
00000000 3                 DATA : INTEGER;
00000000 3                 ERROR : INT;
00000000 3                 TRGMEM : INT;
00000000 2                 END;
00000000 2      WRITE_MEM_PTR = ^ WRITE_MEM_TYPE;
00000000 2
00000000 2  VAR
00000000 2      WRITE_MEM : WRITE_MEM_PTR;
00000004 2      PRI : INT;
00000006 2      TPTR : BUFF_PTR;
0000067E 2
0000067E 2  BEGIN
0000067E 2  INIT(PRI,INTEGER(WRITE_MEM));
0000068C 2  WRITE_MEM^.DATA := INTEGER(ADDR(DATA));
00000698 2  WRITE_MEM^.ADDRESS := ADDRESS;
000006A0 2  FLIP_WORDS(WRITE_MEM^.ADDRESS);
000006AC 2  WRITE_MEM^.COUNT := COUNT;
000006B6 2  WRITE_MEM^.TRGMEM := INT(TRGMEM);
000006C0 2  PLACE_REQUEST(INT(WRITE_MEM_REQUEST),INTEGER(WRITE_MEM));
000006CE 2  ERROR := WRITE_MEM^.ERROR;
000006DA 2  GOBACK(PRI,INTEGER(WRITE_MEM));
000006E8 2  END;
00000000 1
00000000 1  (***************************************************************************)
00000000 1  {                                                                           }
00000000 1  {    LOAD_ABS_FILE ( FNAME, DISC, MEM, ERROR );                             }
00000000 1  {                                                                           }
00000000 1  (***************************************************************************)
00000000 1  PROCEDURE LOAD_ABS_FILE (VAR FNAME : VECTOR0_7; VAR DISC : INT; MEM : INT; VAR ERROR : INT);
00000000 2
00000000 2  TYPE
00000000 2      LOAD_ABS_TYPE = RECORD
00000000 3                 FNAME : VECTOR0_7;
00000000 3                 DISC : INT;
00000000 3                 MEM : INT;
00000000 3                 ERROR : INT;
00000000 2                 END;
00000000 2      LOAD_ABS_PTR = ^ LOAD_ABS_TYPE;
00000000 2
00000000 2  VAR
00000000 2      LOAD_ABS : LOAD_ABS_PTR;
00000004 2      PRI : INT;
000006F0 2
000006F0 2  BEGIN
000006F0 2  INIT(PRI,INTEGER(LOAD_ABS));
000006FE 2  LOAD_ABS^.FNAME := FNAME;
0000070E 2  LOAD_ABS^.DISC := DISC;
0000071A 2  LOAD_ABS^.MEM := MEM;
00000724 2  PLACE_REQUEST(INT(LOAD_ABS_REQUEST),INTEGER(LOAD_ABS));
00000732 2  DISC := LOAD_ABS^.DISC;
0000073E 2  ERROR := LOAD_ABS^.ERROR;
00000748 2  GOBACK(PRI,INTEGER(LOAD_ABS));
00000756 2  END;
00000000 1
00000000 1  (***************************************************************************)
00000000 1  {                                                                           }
00000000 1  {    O_APPLY_BREAK;                                                         }
00000000 1  {                                                                           }
00000000 1  (***************************************************************************)
00000000 1  PROCEDURE O_APPLY_BREAK ;
00000000 2
00000000 2  TYPE
00000000 2      BREAK_TYPE = RECORD
00000000 2                 END;
00000000 2      BREAK_PTR = ^ BREAK_TYPE;
00000000 2
00000000 2  VAR
00000000 2      BREAK : BREAK_PTR;
00000004 2      PRI : INT;
00000760 2
00000760 2  BEGIN
00000760 2  INIT(PRI,INTEGER(BREAK));
0000076E 2  PLACE_REQUEST(INT(BREAK_REQUEST),INTEGER(BREAK));
```

```
0000077C  2  GOBACK(PRI,INTEGER(BREAK));
0000078A  2  END;
00000000  1
00000000  1  {**************************************************************************}
00000000  1  {                                                                          }
00000000  1  {    APPLY_RESET;                                                          }
00000000  1  {                                                                          }
00000000  1  {**************************************************************************}
00000000  1  PROCEDURE APPLY_RESET ;
00000000  2
00000000  2  TYPE
00000000  2      RESET_TYPE = RECORD
00000000  2                   END;
00000000  2      RESET_PTR = ^ RESET_TYPE;
00000000  2
00000000  2  VAR
00000000  2      RESET : RESET_PTR;
00000004  2      PRI : INT;
00000792  2
00000792  2  BEGIN
00000792  2  INIT(PRI,INTEGER(RESET));
000007A0  2  PLACE_REQUEST(INT(RESET_REQUEST),INTEGER(RESET));
000007AE  2  GOBACK(PRI,INTEGER(RESET));
000007BC  2  END;
00000000  1
00000000  1  {**************************************************************************}
00000000  1  {                                                                          }
00000000  1  {    RUN ( ADDRESS, RUN_FROM, ERROR ) ;                                    }
00000000  1  {                                                                          }
00000000  1  {**************************************************************************}
00000000  1  PROCEDURE RUN (ADDRESS : INTEGER; RUN_FROM : INT; VAR ERROR : INT);
00000000  2
00000000  2  TYPE
00000000  2      RUN_TYPE = RECORD
00000000  3                 ADDRESS : INTEGER;
00000000  3                 RUN_FROM : INT;
00000000  3                 ERROR : INT;
00000000  2                 END;
00000000  2      RUN_PTR = ^ RUN_TYPE;
00000000  2
00000000  2  VAR
00000000  2      RUN : RUN_PTR;
00000004  2      PRI : INT;
000007C4  2
000007C4  2  BEGIN
000007C4  2  INIT(PRI,INTEGER(RUN));
000007D2  2  RUN^.ADDRESS := ADDRESS;
000007DA  2  FLIP_WORDS(RUN^.ADDRESS);
000007E6  2  RUN^.RUN_FROM := RUN_FROM;
000007F0  2  PLACE_REQUEST(INT(RUN_REQUEST),INTEGER(RUN));
000007FE  2  ERROR := RUN^.ERROR;
0000080A  2  GOBACK(PRI,INTEGER(RUN));
00000818  2  END;
00000000  1
00000000  1  {**************************************************************************}
00000000  1  {                                                                          }
00000000  1  {    EMUL_MSG ( STACK_MSG );                                               }
00000000  1  {                                                                          }
00000000  1  {**************************************************************************}
00000000  1  PROCEDURE EMUL_MSG(STACK_MSG : BOOLEAN);
00000000  2
00000000  2  TYPE
00000000  2      EMUL_MSG_TYPE = RECORD
00000000  3                 STACK_MSG : BOOLEAN;
00000000  2                 END;
00000000  2      EMUL_MSG_PTR = ^ EMUL_MSG_TYPE;
00000000  2
00000000  2  VAR
00000000  2      EMUL_MSG : EMUL_MSG_PTR;
00000004  2      PRI : INT;
00000820  2
00000820  2  BEGIN
00000820  2  INIT(PRI,INTEGER(EMUL_MSG));
0000082E  2  EMUL_MSG^.STACK_MSG := STACK_MSG;
```

```
00000836  2  PLACE_REQUEST(INT(EMUL_MSG_REQUEST),INTEGER(EMUL_MSG));
00000844  2  GOBACK(PRI,INTEGER(EMUL_MSG));
00000852  2  END;
00000000  1
00000000  1  {****************************************************************************}
00000000  1  {                                                                            }
00000000  1  {    READ_REG ( REG, VALUE );                                                }
00000000  1  {                                                                            }
00000000  1  {****************************************************************************}
00000000  1  PROCEDURE READ_REG (REG : INT; VAR VALUE : INTEGER);
00000000  2
00000000  2  TYPE
00000000  2      READ_REG_TYPE = RECORD
00000000  3                  REG : INT;
00000000  3                  VALUE : INTEGER;
00000000  2                  END;
00000000  2      READ_REG_TYPE_PTR = ^ READ_REG_TYPE;
00000000  2
00000000  2  VAR
00000000  2      READ_REG_PTR : READ_REG_TYPE_PTR;
00000004  2      PRI : INT;
0000085A  2
0000085A  2  BEGIN
0000085A  2  INIT(PRI,INTEGER(READ_REG_PTR));
00000868  2  READ_REG_PTR^.REG := REG;
00000870  2  PLACE_REQUEST(INT(READ_REG_REQUEST),INTEGER(READ_REG_PTR));
0000087E  2  VALUE := READ_REG_PTR^.VALUE;
0000088A  2  FLIP_WORDS(VALUE);
00000896  2  GOBACK(PRI,INTEGER(READ_REG_PTR));
000008A4  2  END;
00000000  1
00000000  1  {****************************************************************************}
00000000  1  {                                                                            }
00000000  1  {    EMUL_STATUS ( NUMBER, ERROR );                                          }
00000000  1  {                                                                            }
00000000  1  {****************************************************************************}
00000000  1  PROCEDURE EMUL_STATUS (NUMBER : INT; VAR ERROR : INT);
00000000  2
00000000  2  TYPE
00000000  2      EMUL_STATUS_TYPE = RECORD
00000000  3                  NUMBER : INT;
00000000  3                  ERROR : INT;
00000000  2                  END;
00000000  2      EMUL_STATUS_PTR = ^ EMUL_STATUS_TYPE;
00000000  2
00000000  2  VAR
00000000  2      EMUL_STATUS : EMUL_STATUS_PTR;
00000004  2      PRI : INT;
000008AC  2
000008AC  2  BEGIN
000008AC  2  INIT(PRI,INTEGER(EMUL_STATUS));
000008BA  2  EMUL_STATUS^.NUMBER := NUMBER;
000008C2  2  EMUL_STATUS^.ERROR := ERROR;
000008CE  2  PLACE_REQUEST(INT(EMUL_STATUS_REQUEST),INTEGER(EMUL_STATUS));
000008DC  2  ERROR := EMUL_STATUS^.ERROR;
000008E8  2  GOBACK(PRI,INTEGER(EMUL_STATUS));
000008F6  2  END;
00000000  1
00000000  1  {****************************************************************************}
00000000  1  {                                                                            }
00000000  1  {    GET_SEG_REGS ( TABLE );                                                 }
00000000  1  {                                                                            }
00000000  1  {****************************************************************************}
00000000  1  PROCEDURE GET_SEG_REGS (VAR TABLE : VECTOR0_7_I);
00000000  2
00000000  2  TYPE
00000000  2      GET_SEG_REGS_TYPE = RECORD
00000000  3                  TABLE_ADD : INTEGER;
00000000  2                  END;
00000000  2      GET_SEG_REGS_PTR = ^ GET_SEG_REGS_TYPE;
00000000  2
00000000  2  VAR
00000000  2      GET_SEG_REGS : GET_SEG_REGS_PTR;
00000004  2      PRI : INT;
```

```
00000006  2      TABLE_TEMP : ^ VECTORO_7_I;
0000000A  2      I : INT;
000008FE  2
000008FE  2  BEGIN
000008FE  2  INIT(PRI,INTEGER(GET_SEG_REGS));
0000090C  2  NEW(TABLE_TEMP);
0000091C  2  GET_SEG_REGS^.TABLE_ADD := INTEGER(TABLE_TEMP);
00000924  2  PLACE_REQUEST(INT(GET_SEG_REGS_REQUEST),INTEGER(GET_SEG_REGS));
00000932  2  TABLE := TABLE_TEMP^;
00000942  2  FOR I := 0 TO 7 DO
00000946  2      FLIP_WORDS(TABLE[I]);
0000096A  2  DISPOSE(TABLE_TEMP);
0000097A  2  GOBACK(PRI,INTEGER(GET_SEG_REGS));
00000988  2  END;
00000000  1
00000000  1  {***************************************************************************}
00000000  1  {                                                                           }
00000000  1  {    G_AREA_ADDR ( ADDRESS ) ;                                              }
00000000  1  {                                                                           }
00000000  1  {***************************************************************************}
00000000  1  PROCEDURE G_AREA_ADDR (VAR ADDRESS : INT);
00000000  2
00000000  2  TYPE
00000000  2      G_AREA_ADDR_TYPE = RECORD
00000000  3                 ADDRESS : INT;
00000000  2                 END;
00000000  2      G_AREA_ADDR_PTR = ^ G_AREA_ADDR_TYPE;
00000000  2
00000000  2  VAR
00000000  2      AREA_ADDR : G_AREA_ADDR_PTR;
00000004  2      PRI : INT;
00000990  2
00000990  2  BEGIN
00000990  2  INIT(PRI,INTEGER(AREA_ADDR));
0000099E  2  PLACE_REQUEST(INT(G_AREA_ADDR_REQUEST),INTEGER(AREA_ADDR));
000009AC  2  ADDRESS := AREA_ADDR^.ADDRESS;
000009B6  2  GOBACK(PRI,INTEGER(AREA_ADDR));
000009C4  2  END;
00000000  1
00000000  1  {***************************************************************************}
00000000  1  {                                                                           }
00000000  1  {    BPC_READ ( ADDR_68K, ADDR_BPC, LENGTH);                                }
00000000  1  {                                                                           }
00000000  1  {***************************************************************************}
00000000  1  PROCEDURE BPC_READ (ADDR_68K : BUFF_PTR; ADDR_BPC : INT;
00000000  2                      LENGTH : INT);
00000000  2
00000000  2  TYPE
00000000  2      BPC_READ_TYPE = RECORD
00000000  3                 ADDR_68K :  BUFF_PTR;
00000000  3                 ADDR_BPC : INT;
00000000  3                 LENGTH : INT;
00000000  2                 END;
00000000  2      BPC_READ_PTR = ^ BPC_READ_TYPE;
00000000  2
00000000  2  VAR
00000000  2      BPC_READ : BPC_READ_PTR;
00000004  2      PRI : INT;
000009CC  2
000009CC  2  BEGIN
000009CC  2  INIT(PRI,INTEGER(BPC_READ));
000009DA  2  BPC_READ^.ADDR_68K := ADDR_68K;
000009E2  2  BPC_READ^.ADDR_BPC := ADDR_BPC;
000009EC  2  BPC_READ^.LENGTH := LENGTH;
000009F6  2  PLACE_REQUEST(INT(BPC_READ_REQUEST),INTEGER(BPC_READ));
00000A04  2  GOBACK(PRI,INTEGER(BPC_READ));
00000A12  2  END;
00000000  1
00000000  1  {***************************************************************************}
00000000  1  {                                                                           }
00000000  1  {    BPC_WRITE ( ADDR_68K, ADDR_BPC, LENGTH );                              }
00000000  1  {                                                                           }
00000000  1  {***************************************************************************}
```

```
00000000 1 PROCEDURE BPC_WRITE (ADDR_68K : BUFF_PTR; ADDR_BPC : INT;
00000000 2                      LENGTH : INT);
00000000 2
00000000 2 TYPE
00000000 2     BPC_WRITE_TYPE = RECORD
00000000 3                  ADDR_68K : BUFF_PTR;
00000000 3                  ADDR_BPC : INT;
00000000 3                  LENGTH : INT;
00000000 2                  END;
00000000 2     BPC_WRITE_PTR = ^ BPC_WRITE_TYPE;
00000000 2
00000000 2 VAR
00000000 2     BPC_WRITE : BPC_WRITE_PTR;
00000004 2     PRI : INT;
00000A1A 2
00000A1A 2 BEGIN
00000A1A 2 INIT(PRI,INTEGER(BPC_WRITE));
00000A28 2 BPC_WRITE^.ADDR_68K := ADDR_68K;
00000A30 2 BPC_WRITE^.ADDR_BPC := ADDR_BPC;
00000A3A 2 BPC_WRITE^.LENGTH := LENGTH;
00000A44 2 PLACE_REQUEST(INT(BPC_WRITE_REQUEST),INTEGER(BPC_WRITE));
00000A52 2 GOBACK(PRI,INTEGER(BPC_WRITE));
00000A60 2 END;
00000000 1
00000000 1 {***************************************************************************}
00000000 1 {                                                                           }
00000000 1 {    P_FORMATTER ( TABLE, DESTINATION);                                     }
00000000 1 {                                                                           }
00000000 1 {***************************************************************************}
00000000 1 PROCEDURE P_FORMATTER (TABLE : BUFF_PTR; DESTINATION : PTR);
00000000 2
00000000 2 TYPE
00000000 2     P_FORMATTER_TYPE = RECORD
00000000 3                  TABLE : BUFF_PTR;
00000000 3                  DESTINATION : PTR;
00000000 2                  END;
00000000 2     P_FORMATTER_PTR = ^ P_FORMATTER_TYPE;
00000000 2
00000000 2 VAR
00000000 2     P_FORMATTER : P_FORMATTER_PTR;
00000004 2     PRI : INT;
00000A68 2
00000A68 2 BEGIN
00000A68 2 INIT(PRI,INTEGER(P_FORMATTER));
00000A76 2 P_FORMATTER^.TABLE := TABLE;
00000A7E 2 P_FORMATTER^.DESTINATION := DESTINATION;
00000A89 2 PLACE_REQUEST(INT(FORMATTER_REQUEST),INTEGER(P_FORMATTER));
00000A96 2 GOBACK(PRI,INTEGER(P_FORMATTER));
00000AA4 2 END;
00000000 1
00000000 1 {***************************************************************************}
00000000 1 {                                                                           }
00000000 1 {    P_CALENDAR ( STRING_PTR );                                             }
00000000 1 {                                                                           }
00000000 1 {***************************************************************************}
00000000 1 PROCEDURE P_CALENDAR (VAR STRING : VECTOR0_7);
00000000 2
00000000 2 TYPE
00000000 2     P_CALENDAR_TYPE = RECORD
00000000 3                  STRING : VECTOR0_7;
00000000 2                  END;
00000000 2     P_CALENDAR_PTR = ^ P_CALENDAR_TYPE;
00000000 2
00000000 2 VAR
00000000 2     CALENDAR : P_CALENDAR_PTR;
00000004 2     PRI : INT;
00000006 2     I : INT;
00000AAC 2
00000AAC 2 BEGIN
00000AAC 2 INIT(PRI,INTEGER(CALENDAR));
00000ABA 2 FOR I := 0 TO 11 DO
00000ABE 2     CALENDAR^.STRING[I] := 2020H;
00000ADE 2 PLACE_REQUEST(INT(CALENDAR_REQUEST),INTEGER(CALENDAR));
00000AEC 2 FOR I := 0 TO 11 DO
```

```
971 00000AF0  2     STRING[I] := CALENDAR^.STRING[I];
972 00000B1A  2  GOBACK(PRI,INTEGER(CALENDAR));
973 00000B28  2  END;
974 00000000  1
975 00000000  1  {*************************************************************************}
976 00000000  1  {                                                                         }
977 00000000  1  {    OUTIT ( LETTER, VALUE, BASE );                                       }
978 00000000  1  {                                                                         }
979 00000000  1  {*************************************************************************}
980 00000000  1  PROCEDURE OUTIT (LETTER : INT; VALUE : INT; BASE : INT);
981 00000000  2  (*
982 00000000  2  PROCEDURE OUTIT;
983 00000000  2  *)
984 00000000  2  TYPE
985 00000000  2     OUTIT_TYPE = RECORD
986 00000000  3                 LETTER : INT;
987 00000000  3                 VALUE : INT;
988 00000000  3                 BASE : INT;
989 00000000  2                 END;
990 00000000  2     OUTIT_PTR = ^ OUTIT_TYPE;
991 00000000  2
992 00000000  2  VAR
993 00000000  2     OUTIT : OUTIT_PTR;
994 00000004  2     PRI : INT;
995 00000B30  2
996 00000B30  2  BEGIN
997 00000B30  2  INIT(PRI,INTEGER(OUTIT));
998 00000B3E  2  OUTIT^.LETTER := SHIFT(LETTER,-8);
999 00000B4A  2  OUTIT^.VALUE := VALUE;
1000 00000B54  2  OUTIT^.BASE := SHIFT(BASE,-8);
1001 00000B62  2  PLACE_REQUEST(INT(OUTIT_REQUEST),INTEGER(OUTIT));
1002 00000B70  2  GOBACK(PRI,INTEGER(OUTIT));
1003 00000B7E  2  END;
1004 00000000  1  .

End of compilation, number of errors=    0

                      1 "68000"
                      2 *
                      3 * 0[A0] : 0 = AVAILABLE
                      4 *         1 = BUSY
                      5 *
                      6 * 1[A0] : 0 = WAITING
                      7 *         1 = CLEAR
                      8 *
                      9 *PROCEDURE P(VAR S : DOUBLE_BYTE);
                     10     EXTERNAL READ_PRI_
                     11     EXTERNAL SLEEP_
                     12     GLOBAL   P
000000               13 P
000000 4E56 FFFE     14     LINK     A6,#-2
                     15 *WHILE test_and_set_fails DO    {get semaphore?}
000004               16 P04_1
000004 206E 0008     17     MOVEA.L  8[A6],A0
000008 4AD0          18     TAS      [A0]
00000A 6700 002C     19     BEQ      P04_3
                     20 *S.LSB := 1;                    {I'm waiting}
00000E 117C 0000     21     MOVE.B   #0,1[A0]
                     22 *READ_PRI_(PRI);
000014 486E FFFE     23     PEA      -2[A6]
000018 4EBA 0000     24     JSR      READ_PRI_[PC]
00001C 588F          25     ADDQ.L   #4,A7
                     26 *SLEEP_(INTEGER(ADDR(S))+020000H,PRI);
00001E 206E 0008     27     MOVEA.L  8[A6],A0
000022 2008          28     MOVE.L   A0,D0
                     29 *   ADDI.L   #131072,D0
000024 0680          30     ADDI.L   #196608,D0
00002A 2F00          31     MOVE.L   D0,-[A7]
00002C 3F2E FFFE     32     MOVE.W   -2[A6],-[A7]
000030 4EBA 0000     33     JSR      SLEEP_[PC]
000034 5C8F          34     ADDQ.L   #6,A7
000036 60CC          35     BRA.S    P04_1
000038               36 P04_3
```

```
000038 4E5E          UNLK     A6
00003A 4E75          RTS

                  *PROCEDURE V(VAR S : DOUBLE_BYTE);
                     EXTERNAL WAKEUP_
                     GLOBAL   V
00003C            V
00003C 4E56 0000     LINK     A6,#0
                  *IF S.LSB = 1 THEN                  (is anyone waiting?)
000040 206E 0008     MOVEA.L  8[A6],A0
000044 4AE8 0001     TAS      1[A0]
000048 6600 0018     BNE      V05_5
                  *S.MSB := 0;
00004C 10BC 0000     MOVE.B   #0,[A0]
                  *WAKEUP_(INTEGER(ADDR(S))+020000H);
000050 2208          MOVE.L   A0,D1
                  *  ADDI.L   #131072,D1
000052 0681          ADDI.L   #196608,D1
000058 2F01          MOVE.L   D1,-[A7]
00005A 4EBA 0000     JSR      WAKEUP_[PC]
00005E 588F          ADDQ.L   #4,A7
000060 6004          BRA.S    V01_1
000062            V05_5
                  *S.MSB := 0;
000062 10BC 0000     MOVE.B   #0,[A0
000066            V01_1
000066 4E5E          UNLK     A6
000068 4E75          RTS

Errors=   0

                  "68000"

                               EXTERNAL STACK_

000000 00000000                DC.L  STACK_
                  *            DC.L  -1

                               END

Errors=   0

                  "68000"

                               GLOBAL Zstartprogram
000000 2E7C       Zstartprogram  MOVE.L #STACK_,A7
000006 3A7C 0000               MOVE   #0,A5
00000A 3C7C 0000               MOVE   #0,A6
00000E 4ED0                    JMP    [A0]
                               EXTERNAL STACK_

                               GLOBAL Zendprogram
000010 4EF9       Zendprogram  JMP    $

                  *PROCEDURE COPYBYTES (SOURCE, DESTINATION : BYTE_PTR; LENGTH : INT);
                               GLOBAL COPYBYTES
000016            COPYBYTES
000016 4E56 0000               LINK     A6,#0
00001A 302E 0008               MOVE.W   8[A6],D0
00001E 206E 000A               MOVEA.L  10[A6],A0
000022 226E 000E               MOVEA.L  14[A6],A1
000026            COPYBYTES_L1
000026 10D9                    MOVE.B   [A1]+,[A0]+
000028 5340                    SUBQ.W   #1,D0
00002A 6EFA                    BGT      COPYBYTES_L1
00002C 4E5E                    UNLK     A6
00002E 4E75                    RTS

                  *PROCEDURE COPYWORDS (SOURCE, DESTINATION : WORD_PTR; LENGTH : INT);
                               GLOBAL COPYWORDS
000030            COPYWORDS
000030 4E56 0000               LINK     A6,#0
000034 302E 0008               MOVE.W   8[A6],D0
000038 206E 000A               MOVEA.L  10[A6],A0
```

```
00003C 226E 000E              MOVEA.L  14(A6),A1
000040             COPYWORDS_L1
000040 30D9                   MOVE.W   (A1)+,(A0)+
000042 5340                   SUBQ.W   #1,D0
000044 6EFA                   BGT      COPYWORDS_L1
000046 4E5E                   UNLK     A6
000048 4E75                   RTS

                              END

Errors=    0
```

```
00000000  1  "68000"
00000000  1  $FARS
00000000  1  $ASM_FILE+$
00000000  1  $OPTIMIZE$
00000000  1  PROGRAM MEMORY_MAN;
00000000  1  $EXTENSIONS$
00000000  1  $SEPARATE+$
00000000  1  {-------------------------------------------------------------------
00000000  1  MEM_MAN CONTAINS THE MARK AND RELEASE RUN TIME ROUTINES FOR DYNAMIC
00000000  1  MEMORY ALLOCATION IN THE PASCAL COMPILED CODE.
00000000  1
00000000  1  IT ALSO CONTAINS NEW AND DISPOSE
00000000  1
00000000  1  CONSTANTS MUST BE CHANGED TO REFLECT MACHINE WORD SIZE.
00000000  1  -------------------------------------------------------------------}
00000000  1
00000000  1  CONST
00000000  1    BLOCKSIZE=8;   {NUMBER OF MEMORY LOCATIONS FOR A BLOCK}
00000000  1    MARKSIZE=18;   {NUMBER OF MEMORY LOCATIONS FOR A MARK }
00000000  1    IDSIZE = 8;    {NUMBER OF MEMORY LOCATIONS FOR AN ID }
00000000  1
00000000  1
00000000  1  TYPE
00000000  1
00000000  1    S_INT = SIGNED_16;
00000000  1    ID_PTR = ^ID_TYPE;          {POINTER TO THE NEWED SIZE INFO}
00000000  1
00000000  1    ID_TYPE=
00000000  2      RECORD                    {CONTAINS INFO AS TO WHO OWNS THE }
00000000  2        NEXT_ID:ID_PTR;         {NEWED SPACE OF SIZE BELOW        }
00000000  2        SIZE:INTEGER;
00000000  1      END;
00000000  1
00000000  1    PBLOCK=^BLOCK;              {POINTER TO A BLOCK OF USER MEMORY}
00000000  1
00000000  1    BLOCK=                      {WHEN THE BLOCK IS FREE, IT CONTAINS}
00000000  2      RECORD                    {A LINK TO THE NEXT FREE            }
00000000  2        NEXT:PBLOCK;            {BLOCK OF GREATER OR EQUAL SIZE     }
00000000  2        BLENGTH:INTEGER;        {AND A LENGTH.}
00000000  1      END;
00000000  1
00000000  1    PHMARK=^HMARK;              {POINTER TO A MARK IN THE USER'S HEAP}
00000000  1
00000000  1    HMARK=                      {HEAP MARK CONTAINS A POINTER TO THE  }
00000000  2      RECORD                    {FIRST FREE BLOCK OF THIS MARK, A LENGTH}
00000000  2        FREE:PBLOCK;            {TELLING THE TOTAL SIZE OF THIS MARKED}
00000000  2        MLENGTH:INTEGER;        {AREA, AND A POINTER TO ANY PREVIOUS  }
00000000  2        PREV_HMARK:PHMARK;      {MARKED AREAS OF THE HEAP             }
00000000  2        PROCID:S_INT;           {THE PROCESS NUMBER THAT DID THE MARK }
00000000  2        ID_CHAIN:ID_PTR;        {POINTER TO A LIST OF SIZES NEWED     }
00000000  1      END;
00000000  1
00000000  1    ADDRESS=INTEGER;            {USER PASSES THE STARTING ADDRESS OF  }
00000000  1                                {THE HEAP AS AN INTEGER        }
00000000  1
00000000  1
00000000  1  VAR
00000000  1
00000000  1    $EXTVAR+$
```

```
00000000 1   MASTERLINK:PHMARK;          (MASTERLINK POINTS TO THE CURRENT MARK)
00000000 1   MEM_SEM : SIGNED_16,        (SIMAPHORE TO CONTROL MEMORY MANAGEMENT ACCESS)
00000000 1   $EXTVAR-$
00000000 1
00000000 1
00000000 1  (*************************************************************************)
00000000 1  PROCEDURE MEMERR(ERR:BYTE);EXTERNAL;
00000000 1  PROCEDURE DISPOSEING(VAR THISB:PBLOCK;SIZE:INTEGER);EXTERNAL;
00000000 1  PROCEDURE NEWING(VAR THISB:PBLOCK; OBJLEN:INTEGER);EXTERNAL;
00000000 1  PROCEDURE READ_ID_(VAR ID:S_INT);EXTERNAL;
00000000 1  PROCEDURE P(VAR S : SIGNED_16); EXTERNAL;
00000000 1  PROCEDURE V(VAR S : SIGNED_16); EXTERNAL;
00000000 1  PROCEDURE OUTIT(LETTER:CHAR; VALUE:S_INT; BASE:CHAR);EXTERNAL;
00000000 1
00000000 1  $GLOBPROC+$
00000000 1  (*************************************************************************)
00000000 1  PROCEDURE MARK(VAR MRKOUT:PHMARK);
00000000 2
00000000 2  (-----------------------------------------------------------------------
00000000 2  MARK IS USED TO MARK THE USERS HEAP.  IT SEARCHES FOR THE LARGEST
00000000 2  SINGLE FREE BLOCK >=MARKSIZE+BLOCKSIZE IN THE ENTIRE HEAP, NOT JUST THE
00000000 2  CURRENT MARKED AREA.
00000000 2  -----------------------------------------------------------------------)
00000000 2
00000000 2  VAR
00000000 2    PREVB,THISB:PBLOCK;
00000008 2    PREVM,THISM:PHMARK;
00000010 2    FOUND:BOOLEAN;
00000011 2    PID:S_INT;
00000004 2
00000004 2  BEGIN
00000004 2    P(MEM_SEM);
00000010 2    READ_ID_(PID);
0000001A 2    THISM:=MASTERLINK;
00000022 2    IF THISM^.FREE=NIL
0000002A 2       THEN MEMERR(5)          (OUT OF MEMORY)
00000034 2  $OPTIMIZE-$
00000038 2       ELSE
00000038 2  $OPTIMIZE+$
00000038 2          BEGIN                         (BIGBLK AT END OF FREE LIST. THEN )
00000038 2            PREVB:=NIL;                 (SEARCH THE NEXT YOUNGER MARK     )
0000003C 2            THISB:=THISM^.FREE;
00000044 2            FOUND:=FALSE;
00000048 2            WHILE (THISB <> NIL) AND (NOT FOUND) DO
0000005E 2              BEGIN
0000005E 2                IF THISB^.BLENGTH >= BLOCKSIZE+MARKSIZE
0000006E 2                   THEN FOUND:=TRUE
00000076 2                   ELSE
00000076 2                      BEGIN
00000076 2                      PREVB:=THISB;
0000007C 2                      THISB:=THISB^.NEXT;
00000084 2                      END;
00000084 2              END;
00000086 2            IF NOT FOUND
0000008C 2               THEN MEMERR(6)      (BIGGEST BLK FOUND,BUT NOT BIG ENOUGH TO MARK)
00000096 2  $OPTIMIZE-$
0000009A 2               ELSE
0000009A 2  $OPTIMIZE+$
0000009A 2               BEGIN    ( BLOCK BIG ENOUGH )
0000009A 2              PREVM:=MASTERLINK;         (SAVE POINTER TO THE CURRENT MARK)
000000A2 2              MASTERLINK:=PHMARK(THISB);         (MOVE CURRENT MARK POINTER)
000000AA 2              MRKOUT:=MASTERLINK ;                (SET MARKOINTER          )
000000B4 2              MASTERLINK^.PREV_HMARK:=PREVM;         (LINK THE NEW MARK TO )
000000C0 2                                                 (THE OLD MARK         )
000000C0 2              IF PREVB <> NIL THEN
000000C6 2                 BEGIN    (* CREATE HEAD AND TAIL IN FREE LIST *)
000000C6 2                 PREVB^.NEXT:=PBLOCK(INTEGER(MASTERLINK)+INTEGER(MARKSIZE));
000000D8 2                 PREVB^.NEXT^.NEXT:=THISB^.NEXT;
000000E4 2                 PREVB^.NEXT^.BLENGTH:=THISB^.BLENGTH - MARKSIZE;
000000FC 2                 MASTERLINK^.FREE:=PREVM^.FREE;
00000109 2                 END      (* CREATE HEAD AND TAIL IN FREE LIST *)
0000010A 2                ELSE
0000010A 2                 BEGIN    (* A NEW FREE LIST HEAD *)
```

```
0000010A  2                 PREVB:=PBLOCK(INTEGER(MASTERLINK)+INTEGER(MARKSIZE));
0000011A  2                 PREVB^.NEXT:=THISB^.NEXT;
00000124  2                 PREVB^.BLENGTH:=THISB^.BLENGTH - MARKSIZE;
0000013A  2                 MASTERLINK^.FREE:=PREVB;
00000142  2                 END;      (* A NEW FREE LIST HEAD *)
00000142  2               PREVM^.FREE:=NIL;
00000148  2               WITH MASTERLINK^  DO              (SET UP MARK AND BLOCK DATA)
00000150  2                BEGIN
00000150  2                PROCID:=PID;          (MARK THIS MARK AS OWNED BY PID)
0000015A  2                ID_CHAIN:=NIL;        (NO NEWS YET DONE)
0000015E  2                END;                                  (SMALLER THAN OLD BLOCK)
0000015E  2               END;    (BLOCK BIG ENOUGH)
0000015E  2          END;
0000015E  2  V(MEM_SEM);
0000016A  2
0000016A  2  (
0000016A  2  OUTIT('M',S_INT(INTEGER(MRKOUT)),'H');
0000016A  2  )
0000016A  2  END;
00000000  1  (***************************************************************************)
00000000  1
00000000  1  PROCEDURE RELEASE(VAR MRK:PHMARK);
00000000  2  (***************************************************************************
00000000  2  THIS RELEASE ONLY RELEASES THIS MARK (MRK) AND NO OTHERS
00000000  2  ***************************************************************************)
00000000  2
00000000  2
00000000  2  VAR
00000000  2    THISM,PREVM:PHMARK;
00000008  2    THISB:PBLOCK;
0000000C  2    THIS_ID:ID_PTR;
00000010  2    SIZE:INTEGER;
00000172  2
00000172  2
00000172  2  BEGIN
00000172  2  (
00000172  2  OUTIT('r',S_INT(INTEGER(MRK)),'H');
00000172  2  )
00000172  2    P(MEM_SEM);
0000017E  2    THISM:=MASTERLINK;
00000186  2    PREVM:=NIL;
0000018A  2    WHILE (THISM<>MRK) AND (THISM<>NIL) DO
00000196  2      BEGIN
000001A6  2      PREVM:=THISM;
000001AA  2      THISM:=THISM^.PREV_HMARK;
000001B4  2      END;
000001B6  2    $OPTIMIZE-$
000001B6  2    IF THISM<>NIL THEN
000001BE  2    $OPTIMIZE+$
000001BE  2      BEGIN
000001BE  2        IF PREVM = NIL
000001C4  2           THEN BEGIN
000001C4  2                MASTERLINK:=THISM^.PREV_HMARK;       ( FIRST LINK IN CHAIN )
000001D0  2                MASTERLINK^.FREE:=THISM^.FREE;
000001DC  2                END
000001DE  2           ELSE PREVM^.PREV_HMARK:=THISM^.PREV_HMARK;  ( UNLINK MIDDLE LINK )
000001EC  2        IF MRK^.ID_CHAIN <> NIL
000001F8  2           THEN THIS_ID:=MRK^.ID_CHAIN
00000200  2           ELSE THIS_ID:=NIL;
00000204  2        WHILE (THIS_ID <> NIL) DO
0000020A  2           BEGIN  ( DISPOSE ALL NODES ON THE ID_CHAIN )
0000020A  2           THISB:=PBLOCK(THIS_ID);
00000210  2           SIZE:=THIS_ID^.SIZE;
0000021A  2           THIS_ID:=THIS_ID^.NEXT_ID;
00000222  2           DISPOSEING(THISB,SIZE);
00000230  2           END;   ( DISPOSE ALL NODES ON THE ID_CHAIN )
00000232  2        THISB:=PBLOCK(MRK);                (POINT TO OLD MARK AS A BLOCK)
0000023A  2        DISPOSEING(THISB,MARKSIZE);          (RELEASE MARK BY DISPOSE )
0000024A  2      END
0000024C  2    ELSE MEMERR(7);            (TRIED TO RELEASE MARK THAT DOES NOT EXIST)
00000256  2  V(MEM_SEM);
00000262  2  END;
00000000  1  (***************************************************************************)
00000000  1
```

```
00000000 1 FUNCTION ID_MARK(PID:S_INT; VAR CHAIN,PREV_CH:ID_PTR; COUNT:S_INT):BOOLEAN;
00000001 2 {-----------------------------------------------------------------------
00000001 2 THIS PROCEDURE FINDS THE FIRST MARK DONE BY A GIVEN PROCESS WITH PID
00000001 2 PROCESS NUMBER AND RETURNS TRUE IF IT FINDS SUCH A MARK.  IT ALSO RETURNS
00000001 2 CHAIN WHICH IS THE ADDRESS OF THE START OF THE LINKED LIST OF NEWS OF A
00000001 2 GIVEN PROCESS AND PREV_CH WHICH IS THE ADDRESS OF WHERE THE POINTER IS
00000001 2 KEPT IN THE MARK DATA STRUCTURE.
00000001 2 COUNT IS THE OCCURANCE NUMBER OF THIS ID WE ARE LOOKING FOR.
00000001 2 -----------------------------------------------------------------------}
00000001 2
00000001 2 VAR
00000001 2   FOUND:BOOLEAN;
00000002 2   THISM:PHMARK;
00000006 2   THIS_CNT:S_INT;
0000026A 2
0000026A 2 BEGIN
0000026A 2
0000026A 2 FOUND:=FALSE;
0000026E 2 THISM:=MASTERLINK;
00000276 2 THIS_CNT:=0;
0000027A 2 WHILE (NOT FOUND) AND (THISM^.PREV_HMARK <> NIL) DO
00000294 2   BEGIN   (* SEARCHING FOR A MARK BY THE SAME PROCESS ID *)
00000294 2   IF THISM^.PROCID = PID
0000029E 2      THEN
0000029E 2         BEGIN   (* FOUND ONE *)
0000029E 2         THIS_CNT:=THIS_CNT+1;
000002B2 2         IF THIS_CNT = COUNT
000002AC 2            THEN
000002AC 2               BEGIN  (* THE RIGHT OCCURANCE OF THIS PROCID *)
000002AC 2               FOUND:=TRUE;
000002B2 2               PREV_CH:=ADDR(THISM^.ID_CHAIN);
000002BC 2               CHAIN:=THISM^.ID_CHAIN;
000002C4 2               END    (* THE RIGHT OCCURANCE OF THIS PROCID *)
000002C4 2         END;    (* FOUND ONE *)
000002C4 2   THISM:=THISM^.PREV_HMARK;
000002CE 2   END;    (* SEARCHING FOR A MARK BY THE SAME PROCESS ID *)
000002D0 2
000002D0 2 ID_MARK:=FOUND;
000002D6 2
000002D6 2 END;    (* ID_MARK *)
00000000 1
00000000 1
00000000 1
00000000 1 PROCEDURE NEW(VAR LOC:PBLOCK; OBJLEN:INTEGER);
00000000 2 {-----------------------------------------------------------------------
00000000 2 THIS PROCEDURE DOES THE LINKING OF THE NEW INTO THE ID_CHAIN IF A
00000000 2 MARK HAS BEEN DONE BY THE SAME PROCESS PREVIOUSLY.  IT THEN CALLS NEWING
00000000 2 WHICH DOES THE ACTUAL NEW.
00000000 2 -----------------------------------------------------------------------}
00000000 2
00000000 2 VAR
00000000 2   CHAIN,PREV_CH:ID_PTR;
00000008 2   PID:S_INT;
000002E4 2
000002E4 2 BEGIN
000002E4 2
000002E4 2 P(MEM_SEM);
000002F0 2 READ_ID_(PID);
000002FA 2 IF ID_MARK(PID,CHAIN,PREV_CH,1)  (* GET THE FIRST OCCURANCE OF A MARK WITH THIS ID *)
00000318 2   THEN
00000318 2      BEGIN     (* HAVE A MARK BY THE SAME PROCESS *)
00000318 2      WHILE (CHAIN <> NIL) DO
0000031E 2         BEGIN  (* GET TO THE END OF THE CHAIN *)
0000031E 2         PREV_CH:=CHAIN;
00000324 2         CHAIN:=CHAIN^.NEXT_ID;
0000032C 2         END;   (* GET TO THE END OF THE CHAIN *)
0000032E 2      NEWING(LOC,OBJLEN+IDSIZE);
00000342 2      CHAIN:=ID_PTR(LOC);
0000034A 2      PREV_CH^.NEXT_ID:=CHAIN;
00000352 2      CHAIN^.NEXT_ID:=NIL;
00000358 2      CHAIN^.SIZE:=OBJLEN+IDSIZE;
00000366 2      LOC:=PBLOCK(INTEGER(LOC)+IDSIZE);  {RETURN TO CALLER THE ADDRESS WHERE  }
00000374 2                                          THIS SPACE ACTUALLY STARTS           }
00000374 2      END      (* HAVE A MARK BY THE SAME PROCESS *)
```

```
00000376  2    ELSE
00000376  2       NEWING(LOC,OBJLEN);
00000386  2
00000386  2  V(MEM_SEM);
00000392  2
00000392  2  {
00000392  2  OUTIT('n',S_INT(INTEGER(LOC)),'H');
00000392  2  OUTIT('1',S_INT(INTEGER(OBJLEN)),'H');
00000392  2  }
00000392  2  END;    (* NEW *)
00000000  1
00000000  1
00000000  1  PROCEDURE DISPOSE(VAR LOC:PBLOCK; SIZE:INTEGER);
00000000  2  (--------------------------------------------------------------
00000000  2  THIS PROCEDURE UNLINKS THE ID_TYPE NODE IF ITS CORRESPONDING NEW
00000000  2  WAS ASSOCIATED WITH A GIVEN MARK .IT THEN CALLS DISPOSING TO PUT
00000000  2  THE INFORMATION BACK IN THE MEMORY POOL
00000000  2  --------------------------------------------------------------)
00000000  2
00000000  2  VAR
00000000  2    PID:S_INT;
00000002  2    CHAIN,PREV_CH:ID_PTR;
0000000A  2    DISP_LOC:ID_PTR;
0000000E  2    FOUND:BOOLEAN;
0000000F  2    OCCUR:S_INT;
0000039A  2
0000039A  2  BEGIN
0000039A  2
0000039A  2  {
0000039A  2  OUTIT('d',S_INT(INTEGER(LOC)),'H');
0000039A  2  OUTIT('1',S_INT(INTEGER(SIZE)),'H');
0000039A  2  }
0000039A  2
0000039A  2  P(MEM_SEM);
000003A6  2  READ_ID_(PID);
000003B0  2  OCCUR:=1;
000003B6  2  FOUND:=FALSE;
000003BA  2  DISP_LOC:=ID_PTR(INTEGER(LOC)-IDSIZE);   { THE ADDRESS THE CALLER HAS IS NOT }
000003C6  2                                          { THE START OF THE ID RECORD SO ADJUST }
000003C6  2  WHILE (ID_MARK(PID,CHAIN,PREV_CH,OCCUR)) AND (NOT FOUND) DO
000003EC  2    BEGIN   (* FOUND A MARK WITH THE SAME ID *)
000003EC  2    WHILE (CHAIN <> NIL) AND (NOT FOUND) DO
00000402  2       BEGIN   (* SEE IF AREA WAS NEWED WITH A MARK *)
00000402  2       IF CHAIN = DISP_LOC
0000040C  2          THEN  FOUND:=TRUE
00000414  2          ELSE
00000414  2             BEGIN   (* KEEP LOOKING *)
00000414  2             PREV_CH:=CHAIN;
0000041A  2             CHAIN:=CHAIN^.NEXT_ID;
00000422  2             END;    (* KEEP LOOKING *)
00000422  2       END;   (* SEE IF AREA WHAS NEWED WITH A MARK *)
00000424  2    IF FOUND
0000042A  2       THEN
0000042A  2          BEGIN  (* UNLINK ENTRY *)
0000042A  2          PREV_CH^.NEXT_ID:=CHAIN^.NEXT_ID;
00000434  2          DISPOSEING(PBLOCK(DISP_LOC),SIZE+IDSIZE);
00000446  2          END    (* UNLINK ENTRY *)
00000448  2       ELSE
00000448  2          OCCUR:=OCCUR+1;   (* LOOK FOR THE NEXT OCCURANCE *)
0000044C  2    END;    (* FOUND A MARK WITH THE SAME ID *)
00000450  2
00000450  2  IF NOT FOUND
00000456  2    THEN
00000456  2       DISPOSEING(LOC,SIZE);   (* NOT PART OF A MARK *)
00000466  2
00000466  2  V(MEM_SEM);
00000472  2  END;   (* DISPOSE *)
00000000  1
00000000  1  PROCEDURE NEW_IT(OBJLEN:S_INT; VAR LOC:PBLOCK);
0000047A  2  (*****************************************************************
0000047A  2   INTERFACE ROUTINE TO ALLOW THE USER TO SPECIFY THE LENGTH OF
0000047A  2   MEMORY REQUIRED AND STILL USE NEW CALLED BY THE COMPILER
0000047A  2  *****************************************************************)
0000047A  2  BEGIN
```

```
0000047A  2
0000047A  2  NEW(LOC,OBJLEN*2);
00000490  2
00000490  2  END;     (* NEW_IT *)
00000000  1
00000000  1
00000000  1  PROCEDURE DISPOSE_IT(SIZE:S_INT; VAR LOC:PBLOCK);
00000498  2  (*********************************************************************
00000498  2   INTERFACE ROUTINE TO ALLOW THE USER TO SPECIFY THE LENGTH OF
00000498  2   MEMORY REQUIRED AND STILL USE DISPOSE CALLED BY THE COMPILER
00000498  2  *********************************************************************)
00000498  2  BEGIN
00000498  2
00000498  2  DISPOSE(LOC,SIZE*2);
000004AE  2
000004AE  2  END;    (* DISPOSE_IT *)
00000000  1  .

End of compilation, number of errors=    0
00000000  1  "68000"
00000000  1  $FAR$
00000000  1  $ASM_FILE+$
00000000  1  $OPTIMIZE$
00000000  1
00000000  1  PROGRAM MEMORY_UTILITIES;
00000000  1  $EXTENSIONS$
00000000  1
00000000  1  $SEPARATE+$
00000000  1  {----------------------------------------------------------------------
00000000  1  MEMORY_UTILITITES CONTAINS THE PROCEDURES: INITHEAP
00000000  1                                             NEWING
00000000  1                                             DISPOSEING
00000000  1
00000000  1  THESE PROCEDURES ARE FOR MANAGEMENT OF DYNAMIC ALLOCATION OF
00000000  1  MEMORY BY THE USERS.
00000000  1
00000000  1  SEE EACH PROCEDURE FOR A DETAILED DESCRIPTION OF OPERATION.
00000000  1
00000000  1  CONSTANTS MUST BE SET, PRIOR TO COMPILATION, FOR MACHINCE WORD SIZE.
00000000  1
00000000  1  ----------------------------------------------------------------------}
00000000  1
00000000  1  CONST
00000000  1     BLOCKSIZE=8;   {NUMBER OF MEMORY LOCATIONS FOR A BLOCK}
00000000  1     MARKSIZE=10;   {NUMBER OF MEMORY LOCATIONS FOR A MARK }
00000000  1     IDSIZE = 8;    {NUMBER OF MEMORY LOCATIONS FOR AN ID }
00000000  1
00000000  1  TYPE
00000000  1
00000000  1     S_INT = SIGNED_16;
00000000  1     ID_PTR = ^ID_TYPE;             {POINTER TO THE NEWED SIZE INFO}
00000000  1
00000000  1     ID_TYPE=
00000000  2        RECORD                      {CONTAINS INFO AS TO WHO OWNS THE }
00000000  2          NEXT_ID:ID_PTR;           {NEWED SPACE OF SIZE BELOW        }
00000000  2          SIZE:INTEGER;
00000000  1        END;
00000000  1
00000000  1     PBLOCK=^BLOCK;                 {POINTER TO A BLOCK OF USER MEMORY}
00000000  1
00000000  1     BLOCK=                         {WHEN THE BLOCK IS FREE, IT CONTAINS}
00000000  2        RECORD                      {A LINK TO THE NEXT FREE           }
00000000  2          NEXT:PBLOCK;              {BLOCK OF GREATER OR EQUAL SIZE    }
00000000  2          BLENGTH:INTEGER;          {AND A LENGTH.}
00000000  1        END;
00000000  1
00000000  1     PHMARK=^HMARK;                 {POINTER TO A MARK IN THE USER'S HEAP}
00000000  1
00000000  1     HMARK=                         {HEAP MARK CONTAINS A POINTER TO THE  }
00000000  2        RECORD                      {FIRST FREE BLOCK OF THIS MARK, A LENGTH}
00000000  2          FREE:PBLOCK;              {TELLING THE TOTAL SIZE OF THIS MARKED}
00000000  2          MLENGTH:INTEGER;          {AREA, AND A POINTER TO ANY PREVIOUS  }
00000000  2          PREV_HMARK:PHMARK;        {MARKED AREAS OF THE HEAP             }
00000000  2          PROCID:S_INT;             {THE PROCESS NUMBER THAT DID THE MARK }
```

```
00000000  2          ID_CHAIN:ID_PTR;        {POINTER TO A LIST OF SIZES NEWED     }
00000000  1        END;
00000000  1
00000000  1     ADDRESS=INTEGER;            {USER PASSES THE STARTING ADDRESS OF  }
00000000  1                                 {THE HEAP AS AN INTEGER        }
00000000  1
00000000  1     HEAP_REC = RECORD
00000000  2       HEAPSTART:INTEGER;
00000000  2       HEAPLENGTH:INTEGER;
00000000  1     END;
00000000  1
00000000  1     HEAP_TBL = ARRAY[1..100] OF HEAP_REC;
00000000  1
00000000  1  VAR
00000000  1  $GLOBVAR+$
00000000  1     MASTERLINK:PHMARK;
00000004  1     MEM_SEM : SIGNED_16;        {SEMAPHORE TO CONTROL MEMORY MANAGEMENT ACCESS}
00000006  1  $GLOBVAR-$
00000000  1
00000000  1  {--------------------------------------------------------------------}
00000000  1  PROCEDURE MEMERR(ERRORNUM:BYTE);EXTERNAL;
00000000  1  PROCEDURE OUTIT(LETTER:CHAR; VALUE:SIGNED_16; BASE:CHAR);EXTERNAL;
00000000  1
00000000  1  $GLOBPROC+$
00000000  1
00000000  1  {********************************************************************}
00000000  1
00000000  1  PROCEDURE INITHEAP(TBLSIZE:S_INT; VAR TBL:HEAP_TBL);
00000000  2  (*********************************************************************
00000000  2  INITHEAP CREATES A FREE LIST INITIALIZED WITH THE NUMBER OF NODES SPECIFIED
00000000  2  IN TBLSIZE AND AT ADDRESSES AND SIZES CONTAINED IN TBL.  AN INITIAL MARK
00000000  2  IS CREATED WITH THE NUMBER OF NODES OF FREE NODES LINKED TO IT
00000000  2  *********************************************************************)
00000000  2
00000000  2  VAR
00000000  2    LINK:PBLOCK;
00000004  2    I:S_INT;
00000004  2
00000004  2  BEGIN
00000004  2    MEM_SEM:=80H;     { INITIALIZES THE SEMAPHORE TO AVAILABLE }
0000000C  2    IF TBL[1].HEAPLENGTH<INTEGER(MARKSIZE+BLOCKSIZE) THEN  {HEAPLENGTH NOT ENOUGH}
0000001C  2       BEGIN
0000001C  2         MASTERLINK:=NIL;
00000022  2         MEMERR(1);
0000002C  2  $OPTIMIZE OFF$
0000002C  2       END
00000030  2    ELSE BEGIN
00000030  2  $OPTIMIZE ON$
00000030  2    MASTERLINK:=PHMARK(TBL[1].HEAPSTART);       {POINT TO START OF HEAP}
0000003A  2    WITH TBL[1],MASTERLINK^ DO
00000046  2      BEGIN
00000046  2        FREE:=PBLOCK(HEAPSTART+INTEGER(MARKSIZE));     {PUT A PSEUDO-MARK THERE}
00000054  2        MLENGTH:=HEAPLENGTH;
0000005A  2        PREV_HMARK:=NIL;                 {NO PREVIOUS MARKS}
0000005E  2        IF TBLSIZE > 1
00000068  2           THEN
00000068  2              FREE^.NEXT:=PBLOCK(TBL[2].HEAPSTART)
00000070  2           ELSE
00000070  2              FREE^.NEXT:=NIL;
00000078  2        FREE^.BLENGTH:=(MLENGTH-INTEGER(MARKSIZE)); {WE LOST INTEGER(MARKSIZE) LOCATIONS}
0000008C  2        PROCID:=0;                    {NOBODY OWNS THIS PSEUDO_MARK }
00000090  2        ID_CHAIN:=NIL;                {IT HAS NO NEWS ASSOCIATED WITH IT}
00000094  2      END;
00000094  2    LINK:=MASTERLINK^.FREE^.NEXT;
000000A0  2    FOR I:=2 TO TBLSIZE DO
000000B4  2      BEGIN   (* GET REST OF NODES LINKED IN *)
000000B4  2      IF TBLSIZE > I
000000BE  2         THEN
000000BE  2            LINK^.NEXT:=PBLOCK(TBL[I+1].HEAPSTART)
000000D6  2         ELSE
000000D6  2            LINK^.NEXT:=NIL;
000000DC  2      LINK^.BLENGTH:=TBL[I].HEAPLENGTH;
000000F6  2      LINK:=LINK^.NEXT;
```

```
000000FE  2      END;    (* GET REST OF NODES LINKED IN *)
0000010E  2    END;
0000010E  2  END;
00000000  1
00000000  1
00000000  1  PROCEDURE CHECK_POOL;
00000000  2  (****************************************************************************
00000000  2  THIS PROCEDURE OUTIT'S THE STATUS OF THE FREE LIST TO THE SCREEN WHEN
00000000  2  CALLED
00000000  2  *****************************************************************************)
00000000  2
00000000  2  VAR
00000000  2    LINK:PBLOCK;
00000116  2
00000116  2  BEGIN
00000116  2
00000116  2  OUTIT('C',0,'D');
00000126  2  LINK:=MASTERLINK^.FREE;
00000130  2  WHILE LINK <> NIL DO
00000136  2    BEGIN  (* OUT THE FREE LIST *)
00000136  2    OUTIT('A',S_INT(LINK),'H');
****WARNING ??                   ^505
00000148  2    OUTIT('A',S_INT(INTEGER(LINK)),'H');
0000015C  2    OUTIT('S',S_INT(LINK^.BLENGTH),'H');
00000174  2    LINK:=LINK^.NEXT;
0000017C  2    END;   (* OUT THE FREE LIST *)
0000017E  2  OUTIT('C',1,'D');
00000190  2
00000190  2  END;     (* CHECK_POOL *)
00000000  1
00000000  1
00000000  1  $GLOBPROC-$
00000000  1
00000000  1
00000000  1  (*****************************************************************************)
00000000  1  PROCEDURE INSERT(BLKIN:PBLOCK; THISM:PMMARK);
00000000  2
00000000  2  {--------------------------------------------------------------------------
00000000  2  INSERT IS USED BY DISPOSE  TO INSERT A FREE BLOCK BACK INTO THE FREE
00000000  2  LIST OF THE AREA OF THE HEAP POINTED TO BY THISM IN A PLACE THAT IS
00000000  2  BASED ON THE LENGTH OF THE BLOCK.
00000000  2  ---------------------------------------------------------------------------}
00000000  2
00000000  2  VAR
00000000  2    THISB,PREVB:PBLOCK;
00000000  2    PUT:BOOLEAN;
00000198  2
00000198  2
00000198  2    {A MARK WHICH INCLUDED THE FREED BLOCK AT ONE TIME IS POINTED AT BY
00000198  2     THISM.}
00000198  2
00000198  2  BEGIN
00000198  2    THISB:=THISM^.FREE;     {POINT TO FIRST FREE BLOCK IN THIS MARKED}
000001A0  2    PREVB:=NIL;             {AREA OF THE HEAP}
000001A4  2    PUT:=FALSE;
000001A8  2
000001A8  2    {SEARCH FREE LIST TILL END,OR INSERTED }
000001A8  2
000001A8  2    WHILE (THISB<>NIL) AND (NOT(PUT))  DO
000001BE  2      IF BLKIN^.BLENGTH > THISB^.BLENGTH THEN   {BLOCK BELONGS FURTHER}
000001D0  2        BEGIN                                   {DOWN IN LIST}
000001D0  2          PREVB:=THISB;
000001D6  2          THISB:=THISB^.NEXT;
000001DE  2        END
000001E0  2      ELSE
000001E0  2        BEGIN
000001E0  2          IF PREVB=NIL THEN THISM^.FREE:=BLKIN    {SPOT FOUND FOR }
000001F0  2          ELSE              PREVB^.NEXT:=BLKIN;   {THIS BLOCK}
000001F8  2
000001F8  2          BLKIN^.NEXT:=THISB;
00000200  2          PUT:=TRUE;
00000206  2        END;
00000208  2    IF NOT(PUT) THEN
0000020E  2      BEGIN
```

```
0000020E  2        BLKIN^.NEXT:=NIL;                    {SET LINK TO NIL}
00000214  2        IF PREVB=NIL THEN                    {BECOMES THE ONLY  }
0000021A  2           THISM^.FREE:=BLKIN               {BLK IN THE FREE LIST}
00000224  2        ELSE
00000224  2           PREVB^.NEXT:=BLKIN;               {ADD TO END OF NON-}
0000022C  2     END;
0000022C  2  END;  {INSERT}                             {EMPTY FREELIST    }
00000000  1
00000000  1  {*************************************************************************}
00000000  1  PROCEDURE REMOVE(RMARK:PHMARK;RITEM:PBLOCK);
00000000  2
00000000  2  {-----------------------------------------------------------------------
00000000  2   REMOVE CHECKS TO SEE IF THE DESIRED BLOCK IS THE FIRST IN THE LIST,
00000000  2   IN WHICH IT UNLINKS AT THE MARK, ELSE A SEARCH IS MADE THROUGH THE
00000000  2   FREE LIST TILL THE DESIRED BLOCK IS FOUND AND UNLINKED AT IT'S
00000000  2   PREDECESSOR.
00000000  2   ---------------------------------------------------------------------}
00000000  2
00000000  2  VAR
00000000  2    PTR:PBLOCK;
00000234  2
00000234  2  BEGIN
00000234  2    IF RMARK^.FREE=RITEM THEN RMARK^.FREE:=RITEM^.NEXT {BLOCK IS FIRST IN}
00000248  2                                                   {THE LIST,UNLINK}
00000248  2    ELSE
00000248  2      BEGIN
00000248  2        PTR:=RMARK^.FREE;                          {BLOCK NOT FIRST}
00000250  2        WHILE PTR^.NEXT <> RITEM DO PTR:=PTR^.NEXT;   {SEARCH DOWN LIST}
00000262  2        PTR^.NEXT:=RITEM^.NEXT;                    {FOUND, UNLINK}
0000026C  2      END;
0000026C  2  END;
00000000  1
00000000  1  {*************************************************************************}
00000000  1  PROCEDURE CKBOUNDS(VAR BLK:PBLOCK; THISM:PHMARK);
00000000  2
00000000  2  {-----------------------------------------------------------------------
00000000  2   CKBOUNDS IS A RECURSIVE PROCEDURE WHICH SEARCHES THE FREE LIST POINTED
00000000  2   TO BY THE HEAP MARKER-THISM FOR ANY BLOCK IN THE FREE LIST WHICH IS
00000000  2   PHYSICALLY ADJACENT TO THE BLOCK POINTED TO BY BLK.  WHEN AN
00000000  2   ADJACENT BLOCK IS FOUND, THE TWO BLOCKS ARE COMBINED TO MAKE A NEW
00000000  2   BIGGER BLOCK POINTED TO BY BLK, THE FOUND BLOCK IS REMOVED FROM THE
00000000  2   FREE LIST, CKBOUNDS THEN CALLS ITSELF TO LOOK FOR ANOTHER BLOCK WHICH
00000000  2   MIGHT BE CLOSE.  THE ROUTINE ENDS WHEN IT HAS SEARCHED THE FREE LIST
00000000  2   COMPLETELY AND FOUND NO ADJACENT BLOCKS.
00000000  2
00000000  2   CKBOUNDS IS CALLED BY DISPOSE AND THEN MAY CALL ITSELF
00000000  2  -----------------------------------------------------------------------}
00000000  2
00000000  2  TYPE
00000000  2    FLAG=(INFRONT,INBACK,NOTCLOSE);
00000000  2
00000000  2  VAR
00000000  2    THISB:PBLOCK;
00000004  2    BLKTEST:FLAG;
00000274  2
00000274  2  BEGIN
00000274  2    THISB:=THISM^.FREE;
0000027C  2  $OPTIMIZE-$
0000027C  2    WHILE THISB <> NIL DO
00000284  2  $OPTIMIZE+$
00000284  2      BEGIN
00000284  2        IF ((INTEGER(THISB)+THISB^.BLENGTH)=(INTEGER(BLK))) THEN
00000298  2          BLKTEST:=INFRONT
0000029E  2        ELSE
0000029E  2          IF ((INTEGER(BLK)+BLK^.BLENGTH)=(INTEGER(THISB))) THEN
000002B4  2            BLKTEST:=INBACK
000002BC  2          ELSE
000002BC  2            BLKTEST:=NOTCLOSE;
000002C2  2        IF BLKTEST <> NOTCLOSE THEN
000002CC  2          BEGIN
000002CC  2            IF BLKTEST=INFRONT THEN
000002D0  2              BEGIN
000002D0  2                THISB^.BLENGTH:=THISB^.BLENGTH+BLK^.BLENGTH;
000002E6  2                BLK:=THISB;    {INFRONT, ADD LENGTH OF BLK TO FRONT BLOCK
```

```
000002EE  2                          AND MAKE BLK POINT TO THE FRONT BLOCK)
000002EE  2            END
000002F0  2          ELSE BLK^.BLENGTH:=BLK^.BLENGTH+THISB^.BLENGTH; (INBACK, ADD
00000306  2                                                         LENGTH OF REAR
00000306  2                                                         BLOCK TO BLK)
00000306  2
00000306  2          REMOVE(THISM,THISB); (UNLINK THE BLOCK IN FRONT OR IN BACK)
00000314  2          CKBOUNDS(BLK,THISM);
00000324  2          THISB:=NIL; (SET FOR XIT FROM CKBOUNDS)
00000328  2        END
0000032A  2      ELSE THISB:=THISB^.NEXT;   (BLOCK WAS NOT CLOSE,TRY THE NEXT BLOCK IN
00000332  2                                  THE FREE LIST)
00000332  2    END;
00000336  2  END;
00000000  1
00000000  1
00000000  1  $GLOBPROC+$
00000000  1
00000000  1  (*************************************************************************)
00000000  1  PROCEDURE DISPOSEING (VAR FREEBLK:PBLOCK; SIZE:INTEGER);
00000000  2
00000000  2  (-----------------------------------------------------------------------
00000000  2   DISPOSE  PUTS A FREED BLOCK OF MEMORY BACK INTO THE PROPER FREELIST
00000000  2   BY FIRST CHECKING FOR
00000000  2   CONTINUITY WITH ANY OTHER FREE BLOCK IN THAT MARKED FREELIST, AND THEN
00000000  2   INSERTING THE BLOCK OR THE COMBINED BLOCK INTO THAT FREELIST.
00000000  2
00000000  2   IF THE SIZE GIVEN IS SMALLER THAN BLOCKSIZE(LINK+SIZE WORDS) THEN SIZE
00000000  2   IS SET TO BLOCKSIZE SIZE SINCE NEW ALLOCATES BLOCKSIZE MINIMUM.
00000000  2  -----------------------------------------------------------------------)
00000000  2
00000000  2  VAR
00000000  2    THISM:PMMARK;                   (POINTS TO MARK CONTAINING BLK TO BE
0000033E  2                                     OPERATED ON)
0000033E  2
0000033E  2  BEGIN
0000033E  2    IF SIZE < INTEGER(BLOCKSIZE) THEN SIZE:=INTEGER(BLOCKSIZE);
00000352  2    FREEBLK^.NEXT:=NIL;
0000035A  2    FREEBLK^.BLENGTH:=SIZE;
00000366  2    THISM:=MASTERLINK;
0000036E  2    IF THISM<>NIL THEN
00000374  2      BEGIN
00000374  2        CKBOUNDS(FREEBLK,THISM);
00000384  2        INSERT(FREEBLK,THISM);
00000394  2      END;
00000394  2  END;
00000000  1  (*************************************************************************)
00000000  1
00000000  1  PROCEDURE NEWING (VAR BLKOUT:PBLOCK;OBJLEN:INTEGER);
00000000  2
00000000  2  (-----------------------------------------------------------------------
00000000  2   NEW  SEARCHES THE MARKED AREA OF THE HEAP POINTED TO BY MASTERLINK
00000000  2   MOVING FROM FREE BLOCK TO FREE BLOCK TILL AN APPROPRIATE SIZE BLOCK
00000000  2   IS FOUND.  THE BLOCK MUST EITHER EQUAL THE NEEDED SIZE OR BE AT LEAST
00000000  2   BLOCKSIZE BIGGER, SINCE THE LEFT OVER MUST AT LEAST BLOCKSIZE LONG TO
00000000  2   HOLD THE LINK POINTER AND LENGTH WHEN FREE.  IF A BLOCK OF NEEDED
00000000  2   SIZE + (BLOCKSIZE-1) WAS ALLOWED TO BE ALLOCATED. THE EXTRA BYTES WOULD
00000000  2   NEVER BE RETURNED WHEN THE BLOCK WAS DISPOSED.  WITH AT LEAST BLOCKSIZE
00000000  2   EXTRA, THE LEFT OVER MAY BE ADDED BACK TO THE FREE LIST AS A FREE
00000000  2   BLOCK, AND USED IN THE FUTURE.  THIS DOES MEAN THAT IF ALL THE BLOCKS
00000000  2   IN THE FREE LIST ARE > SIZE AND < SIZE+BLOCKSIZE NO BLOCK WILL BE
00000000  2   ALLOCATTED CREATING AN ERROR EVEN THOUGH SOME MEMORY DOES EXIST.
00000000  2   PROPER MEMORY MANAGEMENT BY THE USER MUST STILL BE ADHERED TO.
00000000  2
00000000  2   IF THE OBJECT LENGTH IS LESS THAN BLOCKSIZE, BLOCKSIZE BYTES  WILL BE
00000000  2   ALLOCATED SINCE BLOCKSIZE BYTES ARE NEEDED TO RELINK ON THE RETURN OF
00000000  2   THE ALLOCATED BLOCK.
00000000  2  -----------------------------------------------------------------------)
00000000  2
00000000  2  VAR
00000000  2    PREV:PBLOCK;
00000004  2    THIS:PBLOCK;
00000008  2    FOUND,ERROR:BOOLEAN;
0000039C  2
```

```
0000039C  2  BEGIN
0000039C  2    IF MASTERLINK=NIL THEN
000003A9  2                       BEGIN
000003A9  2                         MEMERR(2);       {HEAP NOT INITIALIZED,EXIT.}
000003AE  2                         ERROR:=TRUE;
000003B4  2                       END
000003B4  2  $OPTIMIZE-$
000003B8  2    ELSE IF MASTERLINK^.FREE=NIL THEN
000003C4  2  $OPTIMIZE+$
000003C4  2                                   BEGIN
000003C4  2                                     MEMERR(5); {OUT OF MEMORY}
000003CE  2                                     ERROR:=TRUE;
000003D4  2                                   END
000003D6  2         ELSE
000003D6  2  {***********************SOME FREE SPACE EXISTS IN CURRENT MARK******}
000003D6  2           BEGIN
000003D6  2             IF OBJLEN < INTEGER(BLOCKSIZE) THEN OBJLEN:=INTEGER(BLOCKSIZE);
000003EA  2             PREV:=NIL;
000003EE  2             THIS:=MASTERLINK^.FREE;            {POINT TO FIRST FREE}
000003F8  2             FOUND:=FALSE;                      {BLOCK}
000003FC  2             ERROR:=FALSE;
00000400  2
00000400  2             {***TRAVERSE FREE LIST TILL BLOCKS ARE >= IN LENGTH***}
00000400  2             WHILE (THIS^.BLENGTH < OBJLEN) AND (NOT(ERROR)) DO
0000041E  2               IF (THIS^.NEXT=NIL) THEN
00000426  2                                 BEGIN
00000426  2                                   MEMERR(3);  {NO BLOCK LARGE ENOUGH}
00000430  2                                   ERROR:=TRUE;
00000436  2                                 END
00000438  2               ELSE
00000438  2                 BEGIN
00000438  2                   PREV:=THIS;                      {KEEP CHECKING}
0000043E  2                   THIS:=THIS^.NEXT;                {FURTHER IN   }
00000446  2                 END;                               {FREE LIST}
00000448  2           END;
00000448  2
00000448  2
00000448  2  $OPTIMIZE-$
00000448  2    WHILE NOT(FOUND OR ERROR) DO
00000454  2  $OPTIMIZE+$
00000454  2
00000454  2    {FOUND SOME BLOCK >= TO THAT NEEDED}
00000454  2
00000454  2      BEGIN
00000454  2        IF THIS^.BLENGTH=OBJLEN THEN
00000462  2          BEGIN
00000462  2            BLKOUT:=THIS;          {EXACTLY WHAT THE DOCTOR ORDERED}
0000046A  2            FOUND:=TRUE;           {CHECK IF FIRST BLOCK IN LIST   }
00000470  2            IF PREV=NIL THEN MASTERLINK^.FREE:=THIS^.NEXT
00000484  2                        ELSE PREV^.NEXT:=THIS^.NEXT;
0000048E  2          END
0000048E  2  $OPTIMIZE-$
00000492  2        ELSE
00000492  2   $OPTIMIZE+$
00000492  2          IF THIS^.BLENGTH>=OBJLEN+INTEGER(BLOCKSIZE)
000004A4  2          - THEN
000004A4  2              BEGIN
000004A4  2                BLKOUT:=THIS;     {BIGGER THAN NEEDED BY GOOD AMOUNT}
000004AC  2                FOUND:=TRUE;      {CHECK IF FIRST BLOCK IN LIST}
000004B2  2                IF PREV=NIL THEN
000004B8  2                              BEGIN
000004B8  2                                MASTERLINK^.FREE:=PBLOCK(INTEGER(THIS)+OBJLEN);
000004C8  2                                MASTERLINK^.FREE^.NEXT:=THIS^.NEXT;
000004D6  2                                MASTERLINK^.FREE^.BLENGTH:=THIS^.BLENGTH-OBJLEN;
000004EA  2                              END
000004EC  2                ELSE
000004EC  2                  BEGIN
000004EC  2                    PREV^.NEXT:=THIS^.NEXT;
000004F6  2                    THIS:=PBLOCK(INTEGER(THIS)+OBJLEN);
00000502  2                    OBJLEN:=BLKOUT^.BLENGTH-OBJLEN;
00000514  2                    DISPOSEING(THIS,OBJLEN);
00000520  2                  END
00000520  2              END
00000522  2            ELSE
```

```
424 00000522  2            BEGIN
425 00000522  2              PREV:=THIS;           {BIGGER THAN THE DOCTOR ORDERED}
426 00000528  2              IF THIS^.NEXT=NIL     {BUT NOT BIG ENOUGH FOR THE NURSE}
427 00000530  2                THEN BEGIN          {CHECK IF MORE BLOCKS EXIST}
428 00000530  2                       MEMERR(3);   {NO BLOCK HAS >= OBJLEN+4}
429 0000053A  2                       ERROR:=TRUE;
430 00000540  2                     END
431 00000542  2                ELSE THIS:=THIS^.NEXT;   {MORE EXIST, GO SHOPPING AGAIN}
432 0000054A  2            END; {IF}
433 0000054A  2      END;  {WHILE}
434 0000054E  2  END;  {MEWING }
435 00000000  1  $GLOBPROC-$
436 00000000  1  {**************************************************************************}
437 00000000  1  .

505: Warning: type change changes physical size

End of compilation, number of errors=    0
  1 00000000  1  "68000"
  2 00000000  1  $FAR$
  3 00000000  1  $EXTENSIONS ON$
  4 00000000  1  PROGRAM MEMORY_ERROR;
  5 00000000  1
  6 00000000  1  TYPE
  7 00000000  1          S_INT = SIGNED_16;
  8 00000000  1          POINTER = ^S_INT;
  9 00000000  1          TBL = ARRAY [1..100] OF POINTER;
 10 00000000  1
 11 00000000  1  PROCEDURE OUTIT(LETTER:CHAR; VALUE:S_INT; BASE:CHAR);EXTERNAL;
 12 00000000  1  PROCEDURE P_MESSAGE(MESSPTR:POINTER; CODE:S_INT);EXTERNAL;
 13 00000000  1
 14 00000000  1
 15 00000000  1  $GLOBPROC+$
 16 00000000  1
 17 00000000  1  PROCEDURE MEMERR(ERROR:BYTE);
 18 00000000  2  {**************************************************************
 19 00000000  2  THIS PROCEDURE HANDLES THE FATAL ERRORS FROM THE
 20 00000000  2  DATA BASE BUILDING
 21 00000000  2  **************************************************************}
 22 00000000  2  CONST
 23 00000000  2     CODE = 0C000H;
 24 00000000  2
 25 00000000  2  VAR
 26 00000000  2
 27 00000000  2  $EXTVAR+$
 28 00000000  2  MMESS_TBL:TBL;
 29 00000000  2  $EXTVAR-$
 30 00000004  2
 31 00000004  2  BEGIN
 32 00000004  2  P_MESSAGE(MMESS_TBL[ERROR],CODE);
 33 00000022  2  WHILE TRUE DO;
 34 00000024  2  END;
 35 00000000  1  .

End of compilation, number of errors=    0
LOCATION OBJECT CODE LINE     SOURCE LINE

                        1 "68000"
                        2
                        3 MESSAGE          MACRO &TITLE,&TEXT
                        4 &TITLE           DC.W  (E_&TITLE-&TITLE-2)/2+1
                        5                  ASCII &TEXT
                        6 E_&TITLE         ASCII " "
                        7                  MEND
                        8
                        9         DATA
                       10         CLB        MMESS_TBL
000000                 11 MMESS_TBL
000000 0000001C        12         DC.L       ERROR1
000004 0000003A        13         DC.L       ERROR2
000008 00000052        14         DC.L       ERROR3
00000C 0000006C        15         DC.L       ERROR4
000010 00000094        16         DC.L       ERROR5
```

```
000014 000000A6        DC.L      ERROR6
000018 000000C8        DC.L      ERROR7

00001C                 MESSAGE   ERROR1,"heaplength not big enough"
000039                 MESSAGE   ERROR2,"heap not initialized"
000052                 MESSAGE   ERROR3,"no block large enough"
00006D                 MESSAGE   ERROR4,"block pointed to is outside the heap"
000094                 MESSAGE   ERROR5,"out of memory"
0000A5                 MESSAGE   ERROR6,"block not large enough to mark"
0000C8                 MESSAGE   ERROR7,"tried to release mark that did not exist"

Errors=   0
```

| FILE/PROG NAME | PROGRAM | DATA | COMMON | ABSOLUTE | DATE | TIME | COMMENTS |
|---|---|---|---|---|---|---|---|
| MESS_ENTR:SODAME | 007D000 | | | | Sat, 26 Jan 1985, 12:47 | | |
| CDS_INIT:SODAME | | 0000800 | | 0001010-0001013 | Sat, 26 Jan 1985, 12:44 | | |
| MEM_LIB:SODAME | | | | | | | |
| MEM_MAN:SODAME | 007D0D4 | | | | Sat, 26 Jan 1985, 12:55 | | |
| MEM_UTL:SODAME | 007D566 | 0000856 | | | Sat, 26 Jan 1985, 12:56 | | |
| MEM_ERR:SODAME | 007DAB8 | | | | Sat, 26 Jan 1985, 12:58 | | |
| M_MESSTBL:SODAME | | 000085C | | | Sat, 26 Jan 1985, 12:59 | | |
| MESS_68K:SODAME | 007DAE0 | 0000950 | | | Sat, 26 Jan 1985, 12:48 | | |
| REQUEST:SODAME | 007DBD4 | | | | Sat, 26 Jan 1985, 12:49 | | |
| SEMAPHORE:SODAME | 007E756 | | | | Sat, 26 Jan 1985, 12:54 | | |
| SUPPORT:SODAME | 007E7C0 | | | | Sat, 26 Jan 1985, 12:54 | | |
| next address | 007E80A | 00009D8 | | | | | |
| STACK_ADD:SODAME | 0001000 | | | | Sat, 26 Jan 1985, 12:54 | | |
| next address | 0001004 | | | | | | |
| (SYSTEM:SS_OS) | 007F000 | | | | Fri, 25 Jan 1985, 15:55 | | |
| next address | 007F06A | | | | | | |

```
XFER address= 007DBA2   Defined by MESS_68K
absolute & link_con file name=MESSAGE:SODAME
Total# of bytes loaded= 00019EA

LOCATION OBJECT CODE LINE     SOURCE LINE

                 "68000"
                 *
                 *   Tabs at 5, 15, 35
                 *
                      EXTERNAL PRCSS_INIT, DYN_PRCSS, STAT_PRCSS
                      EXTERNAL P_ADDR, M_CREATE, M_OPEN, M_CLOSE, M_DELETE, M_READ
                      EXTERNAL M_READBACKWARD, M_WRITE, M_WRITEBACKWARD, M_POSITION
                      EXTERNAL READRECNUM, M_FILE_ERR
                 *
                 ********************************* PRCSS_ENTRY *********************************
                 *  PRCSS_ENTRY is the assembly language module containing the entry
                 *  points into the Soda Dynamic and Static Controller   This is simply
                 *  a jump table.  PRCSS_ENTRY is processor independent.
                 *  Author:  Kip Fulghum
                 *  Date:  10-15-82  Revised:  3-30-84
                 *******************************************************************************
                 *
                 *                        *************************
                 *                        ***** Process Info *****
                 *                        *************************
                 *
                 * Entry for PRCSS_INIT
                 *
000000           ENTRY
000000 4EFA 0000      JMP       PRCSS_INIT(PC)
                 *
                 * Entry address for DYN_PRCSS
                 *
000004 00000000       DC.L      DYN_PRCSS          ; If this moves, update ICHILDREN!
                 *
                 * Stack address for DYN_PRCSS
                 *
```

```
LOCATION OBJECT CODE LINE     SOURCE LINE

000008 0005 7FFE        DC.L    DYN_STACK       ; If this moves, update ICHILDREN!
                    *
                    * Entry address for STAT_PRCSS
                    *
00000C 00000000         DC.L    STAT_PRCSS      ; If this moves, update ICHILDREN!
                    *
                    * Stack address for STAT_PRCSS  ; Same stack as Dynamic Controller.
                    *
000010 0005 7FFE        DC.L    DYN_STACK       ; If this moves, update ICHILDREN!
                    *
                    *                   ********************
                    *                   ***** P_ADDR *****
                    *                   ********************
                    *
000014 4EF9             JMP     P_ADDR          ; If this moves, update DYNAMIC!
                    *
                    *                   **********************
                    *                   ***** M_CREATE *****
                    *                   **********************
                    *
00001A 4EF9             JMP     M_CREATE        ; If this moves, update DYNAMIC!
                    *
                    *                   ********************
                    *                   ***** M_OPEN *****
                    *                   ********************
                    *
000020 4EF9             JMP     M_OPEN          ; If this moves, update DYNAMIC!
                    *
                    *                   *********************
                    *                   ***** M_CLOSE *****
                    *                   *********************
                    *
000026 4EF9             JMP     M_CLOSE         ; If this moves, update DYNAMIC!
                    *
                    *                   **********************
                    *                   ***** M_DELETE *****
                    *                   **********************
                    *
00002C 4EF9             JMP     M_DELETE        ; If this moves, update DYNAMIC!
                    *
                    *                   ********************
                    *                   ***** M_READ *****
                    *                   ********************
                    *
000032 4EF9             JMP     M_READ          ; If this moves, update DYNAMIC!
                    *
                    *                   ****************************
                    *                   ***** M_READBACKWARD *****
                    *                   ****************************
                    *
000038 4EF9             JMP     M_READBACKWARD  ; If this moves, update DYNAMIC!
                    *
                    *                   *********************
                    *                   ***** M_WRITE *****
                    *                   *********************
                    *
00003E 4EF9             JMP     M_WRITE         ; If this moves, update DYNAMIC!
                    *
                    *                   *****************************
                    *                   ***** M_WRITEBACKWARD *****
                    *                   *****************************
                    *
000044 4EF9             JMP     M_WRITEBACKWARD ; If this moves, update DYNAMIC!
                    *
                    *                   ************************
                    *                   ***** M_POSITION *****
                    *                   ************************
                    *
00004A 4EF9             JMP     M_POSITION      ; If this moves, update DYNAMIC!
                    *
```

LOCATION OBJECT CODE LINE SOURCE LINE

```
                   *                  *************************
                   *                  ***** M_READRECNUM *****
                   *                  *************************
                   *
000050 4EF9             JMP     READRECNUM         ; If this moves, update DYNAMIC!
                   *
                   *                  *************************
                   *                  ***** M_FILE_ERR *****
                   *                  *************************
                   *
000056 4EF9             JMP     M_FILE_ERR         ; If this moves, update DYNAMIC!
                   *
                   *  Fork indicator
                   *
                                       ********************
                                       ***** 1000H *****
                                       ********************
                        ORG     1000H
                   ;                ***** Fork Indicator *****
001000 0005 7FFE        DC.L    DYN_STACK
                                       ********************
                                       ***** 57FFEH *****
                                       ********************
                        ORG     57FFEH
                                   ***** Dynamic Controller Stack *****
057FFE             DYN_STACK
                                       ********************
                                       ***** 57C00H *****
                                       ********************
                        ORG     57C00H
057C00                  DS.B    400H
          <0000>        END  ENTRY

Errors=    0

00000000  1  "e8000" PREPROCESS
00000000  1  $EXTENSIONS ON$
00000000  1  $TITLE "Soda Dynamic/Static Controller Initialization"
00000000  1  PROGRAM PROCESS_INIT;
00000000  1  (*
00000000  1  ***************************** PRCSS_INIT ********************************
00000000  1    PRCSS_INIT is the module responsible for initializing the Dynamic and
00000000  1    Static Controllers.  It contains routines for initializing all
00000000  1    necessary data structures, flags, etc. for the controllers to
00000000  1    initially run intelligently.  PRCSS_INIT is processor independent.
00000000  1    Author:  Kip Fulghum
00000000  1    Date:  10-29-82  Revised:  10-25-84
00000000  1  **************************************************************************
00000000  1
00000000  1    PRCSS_INIT contains the following routines:
00000000  1    -Procedure CONTROL_INIT initializes the control word data structure.
00000000  1    -Global procedure PRCSS_INIT controls the initialization of certain
00000000  1     global data structures used by the controllers, as well as
00000000  1     halting the Soda hardware.
00000000  1
00000000  1    In addition, the following external routines are used:  FORK_,
00000000  1    HALT_HW, and GET_BUS_MASK.
00000000  1                                                                        *)
00000000  1  (*
00000000  1                       *************************
00000000  1                       ***** Include Files *****
00000000  1                       *************************
00000000  1                                                                        *)
00000000  1
00000000  1  #INCLUDE CMD_CONST:SS_DYN
00000000  1
00000000  1  #INCLUDE DEBUG_CONST:SS_DYN
00000000  1
00000000  1  #INCLUDE COM_TYPES:SS_DYN
00000000  1
00000000  1  #INCLUDE FM_TYPES:SS_DYN
00000000  1
```

```
00000000  1  #INCLUDE LD_TYPES:SS_DYN
00000000  1
00000000  1  VAR
00000000  1
00000000  1  SEXTVAR ONS
00000000  1
00000000  1    TRACE_HEAD:  TRACE_SPEC_PTR; (* Pointer to beginning of trace
00000000  1                                   specification list *)
00000000  1
00000000  1    CONTROL_ARRAY:  CNTRL_ARRAY_TYPE; (* Array of copies of the
00000000  1                                        system control words/bytes *)
00000000  1
00000000  1    FLAG_ARRAY:  FLAG_ARRAY_TYPE, (* Array of copies of the most current
00000000  1                                   flag words *)
00000000  1
00000000  1    FOOTDC_INFO:  FOOTDC_INFO_TYPE; (* Trace file information *)
00000000  1
00000000  1    DEBUG_FLAG:  S_INT; (* Flag for debug options *)
00000000  1
00000000  1  (* DEBUG *)
00000000  1
00000000  1    DEBUG_PROG:  L_INT; (* Address of debug program *)
00000000  1
00000000  1    DEBUG_STACK:  L_INT; (* Address of debug program stack *)
00000000  1
00000000  1  (* DEBUG *)
00000000  1
00000000  1  SEXTVAR OFFS
00000000  1
00000000  1
00000000  1
00000000  1
00000000  1
00000000  1  SCALL_ABS_LONGS
00000000  1  (*
00000000  1                          ******************
00000000  1                          ***** FORK_ *****
00000000  1                          ******************
00000000  1                                                                  *)
00000000  1  PROCEDURE FORK_ ( PROC_ADDR, PROC_STACK:  L_INT; VAR ID:  S_INT );
00000000  2                    EXTERNAL;
00000000  1  (*
00000000  1    Procedure FORK_ to create a new process.  Procedure uses the given
00000000  1    xfer address and stack to initiate a new process.  Provided as part
00000000  1    of the operating system.
00000000  1                                                                  *)
00000000  1
00000000  1
00000000  1
00000000  1
00000000  1
00000000  1  SCALL_PC_SHORTS
00000000  1  (*
00000000  1                          *******************
00000000  1                          ***** HALT_HW *****
00000000  1                          *******************
00000000  1                                                                  *)
00000000  1  PROCEDURE HALT_HW ( VAR CNTRL_ARRAY:  CNTRL_ARRAY_TYPE; VAR FLG_ARRAY:
00000000  2                      FLAG_ARRAY_TYPE; VAR MAC:  S_INT ); EXTERNAL;
00000000  1  (*
00000000  1    Procedure HALT_HW to halt the hardware:  stop a run.  Procedure also
00000000  1    reads all hardware flags and the memory address counter.  Provided
00000000  1    as a Pascal external.
00000000  1                                                                  *)
00000000  1
00000000  1
00000000  1
00000000  1
00000000  1
00000000  1  (*
00000000  1                        ************************
00000000  1                        ***** GET_BUS_MASK *****
00000000  1                        ************************
00000000  1                                                                  *)
```

```
00000000  1  FUNCTION GET_BUS_MASK ( BUS:  S_INT ):  L_INT; EXTERNAL;
00000000  1  (*
00000000  1    Function GET_BUS_MASK to return the processor specific mask containing
00000000  1    all 1s for all bits on the given bus.  Provided as a Pascal external.
00000000  1                                                                        *)
00000000  1
00000000  1
00000000  1
00000000  1
00000000  1
00000000  1  (*
00000000  1                          *************************
00000000  1                          ***** CONTROL_INIT *****
00000000  1                          *************************
00000000  1                                                                        *)
00000000  1  PROCEDURE CONTROL_INIT ( VAR CNTRL_ARRAY:  CNTRL_ARRAY_TYPE );
00000000  2  (*
00000000  2    Procedure CONTROL_INIT to initialize the control word data structure.
00000000  2    CONTROL_INIT simply sets all control words to their initial values.
00000000  2
00000000  2    CONTROL_INIT uses the following routine:  GET_BUS_MASK.
00000000  2
00000000  2    Input:  1) CNTRL_ARRAY, the array or copies of the control words
00000000  2    Output:  1) CNTRL_ARRAY, the initialized control word array
00000000  2                                                                        *)
00000000  2  VAR
00000000  2
00000000  2    ADDR_MASK:  L_INT; (* Processor mask for address bus *)
00000004  2
00000004  2  BEGIN (* Procedure CONTROL_INIT *)
00000004  2    CNTRL_ARRAY [ CONTROL_1 ] := 0;
0000000A  2    (* Set FSR bus width *)
0000000A  2    ADDR_MASK := SHIFT ( GET_BUS_MASK ( 0 ), -16 );
0000001E  2    CASE ADDR_MASK OF
00000022  2      0000:  (* 16 bit address bus *)
00000022  2        CNTRL_ARRAY [ CONTROL_2 ] := SYNC_INIT_16;
00000032  2      000FH:  (* 20 bit address bus *)
00000032  2        CNTRL_ARRAY [ CONTROL_2 ] := SYNC_INIT_20;
00000042  2      OTHERWISE (* 24 bit address bus *)
00000042  2        CNTRL_ARRAY [ CONTROL_2 ] := SYNC_INIT_24
0000004E  2    END; (* Of case statement *)
00000064  2    CNTRL_ARRAY [ CONTROL_BYTE ] := 0;
0000006C  2    CNTRL_ARRAY [ CONTROL_RESET ] := 0;
00000074  2    CNTRL_ARRAY [ ACQ_BYTE ] := 0
0000007C  2  END; (* Procedure CONTROL_INIT *)
00000000  1
00000000  1
00000000  1
00000000  1
00000000  1
00000000  1  (*
00000000  1                          ***********************
00000000  1                          ***** PRCSS_INIT *****
00000000  1                          ***********************
00000000  1                                                                        *)
00000000  1  $GLOBPROC ON$
00000000  1  PROCEDURE PRCSS_INIT;
00000000  2  (*
00000000  2    Procedure PRCSS_INIT to control the initialization of certain global
00000000  2    data structures used by the controllers, as well as halting
00000000  2    the Soda hardware.  Procedure simply calls routines to do most of
00000000  2    the work.
00000000  2
00000000  2    PRCSS_INIT uses the following routines:  CONTROL_INIT, FORK_, and
00000000  2    HALT_HW
00000000  2
00000000  2    Input:  none
00000000  2    Output:  none
00000000  2                                                                        *)
00000000  2  VAR
00000000  2
00000000  2    MEM_ADRS_CNTR:  S_INT; (* Storage for memory address counter *)
00000002  2
```

```
00000002  2     DEBUG_ID:  S_INT; (* Process I.D. of debug program *)
00000084  2
00000084  2  BEGIN (* Procedure PRCSS_INIT *)
00000084  2     (* Initialize the control word data structure *)
00000084  2     CONTROL_INIT ( CONTROL_ARRAY );
0000008E  2     (* Stop the hardware *)
0000008E  2     HALT_HW ( CONTROL_ARRAY, FLAG_ARRAY, MEM_ADRS_CNTR );
000000A4  2     (* Initialize the head of the trace specification list to empty *)
000000A4  2     TRACE_HEAD := NIL;
000000A8  2     (* Say trace file doesn't exist *)
000000A8  2     FOOTDC_INFO.OPEN_FLAG := FALSE;
000000AC  2     (* Now get debug stuff going *)
000000AC  2     DEBUG_FLAG := DEBUG_OFF;
000000B0  2     FORK_ ( DEBUG_PROG, DEBUG_STACK, DEBUG_ID )
000000C8  2  END; (* Procedure PRCSS_INIT *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $LIB_ABS_LONGS
00000000  1  $TITLE "Soda Dynamic Controller Process"
00000000  1  PROGRAM DYNAMIC_PROCESS;
00000000  1  (*
00000000  1  ******************************** DYN_PRCSS ********************************
00000000  1    This is it:  the main process of the congloneration called the
00000000  1    Soda Dynamic Controller.  This module contains the first level
00000000  1    routine, which trickles control down to all the peons who do the
00000000  1    grunt level stuff, like loading the hardware, starting it, halting it,
00000000  1    and unloading it.  DYN_PRCSS is processor independent.
00000000  1    Author:  Kip Fulghum
00000000  1    Date:  10-15-82  Revised:  1-9-85
00000000  1  ****************************************************************************
00000000  1
00000000  1    The routine contained here essentially regulates the flow of
00000000  1    control between the portions of the Dynamic Controller.  It provides
00000000  1    the necessary sequencing of loading, running, halting, and unloading
00000000  1    given the constraints of the Soda software package and its operating
00000000  1    environment.  Basically, it translates the user description of the
00000000  1    measurement into a linked list of hardware descriptions.  It then
00000000  1    loads the initial specification, starts the hardware, continually
00000000  1    monitors the hardware until the trace is complete, then initiates
00000000  1    the unloading of this portion of the measurement.  If there are
00000000  1    any more trace specifications in the list, the sequence is repeated.
00000000  1    During the above sequence, it is checked to see if the parent
00000000  1    process wishes to quit.  If so, his wish is granted.  Also, the
00000000  1    parent process is kept informed of the state of the Dynamic Controller
00000000  1    as it progresses through the measurement.
00000000  1
00000000  1    DYN_PRCSS contains the following routines:
00000000  1
00000000  1    -Procedure WAIT waits until it is time to continue.
00000000  1    -Procedure MY_EXIT makes a clean getaway from the Dynamic Controller.
00000000  1    -Procedure MY_ENTRY makes a clean entry into the Dynamic Controller.
00000000  1    -Procedure DO_RUN loads, runs, monitors, and halts the given trace
00000000  1     specification.
00000000  1
00000000  1    DYN_PRCSS also uses the following external routines:  SET_PRI_,
00000000  1    SET_SIG_, READ_SIG_, READ_PID_, SLEEP_, EXIT_, EMUL_STATUS,
00000000  1    D_APPLY_BREAK, RUN, TRANS_MEAS_IN, TRANS_SPEC_OUT, TRANS_MAC_ADRS,
00000000  1    BUILD_SYM_TAB, GET_NEXT_SPEC, SET_SPEC, START_FOOTDC, WRITE_MSG_REC,
00000000  1    FINISH_FOOTDC, LOAD_HW, RUN_HW, MONITOR_HW, HALT_HW, LOAD_MSG,
00000000  1    RUN_MSG, EXIT_MSG, TEST_FEATURE, and DISABLE_CHECK.
00000000  1                                                                         *)
00000000  1  (*
00000000  1                          **************************
00000000  1                          ***** Include Files *****
00000000  1                          **************************
00000000  1                                                                         *)
00000000  1
```

```
00000000  1  #INCLUDE ER_CONST:SS_DYN
00000000  1
00000000  1  #INCLUDE COM_TYPES:SS_DYN
00000000  1
00000000  1  #INCLUDE PRCSS_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1  #INCLUDE ICHILDREN:SODAMON
00000000  1
00000000  1  #INCLUDE TRANS_TYPES:SS_DYN
00000000  1
00000000  1  VAR
00000000  1
00000000  1  $GLOBVAR ON$
00000000  1
00000000  1    CARE_PACKAGE:  PARAMETER_PTR; (* Care package pointer from parent *)
00000004  1
00000004  1    TRACE_HEAD:  TRACE_SPEC_PTR; (* Pointer to beginning of trace
00000008  1                                     specification list *)
00000008  1
00000008  1    CONTROL_ARRAY:  CNTRL_ARRAY_TYPE; (* Array of copies of the
0000001C  1                                          system control words/bytes *)
0000001C  1
0000001C  1    FLAG_ARRAY:  FLAG_ARRAY_TYPE; (* Array of copies of the most current
00000022  1                                     flag words *)
00000022  1
00000022  1    SYMBOL_TABLE:  SYM_DESCRIPS; (* Symbol table *)
00000060  1
00000060  1    DEBUG_FLAG:  S_INT; (* Flag for debug options *)
00000062  1
00000062  1  $ORG 800H$
00000062  1
00000062  1    HOWS_IT_GOING:  REP_STRUCT; (* Structure to report status to EPC *)
00000062  1
00000062  1  $END_ORG$
00000062  1
00000062  1  $GLOBVAR OFF$
00000062  1
00000062  1    DYN_PTR:  S_INT_PTR; (* Pointer for MARK/RELEASE *)
00000066  1
00000066  1    MEM_UNLD_CNTR:  S_INT; (* # of unloaded and valid states *)
00000068  1
00000068  1
00000068  1
00000068  1
00000068  1
00000068  1  $CALL_ABS_LONG$
00000000  1  (*
00000000  1                            *********************
00000000  1                            ***** SET_PRI_ *****
00000000  1                            *********************
00000000  1                                                                        *)
00000000  1  PROCEDURE SET_PRI_ ( PRI:  S_INT ); EXTERNAL;
00000000  1  (*
00000000  1    Procedure SET_PRI_ to reset the current process' priority
00000000  1    to the given value.  Provided as part of the operating system.
00000000  1                                                                        *)
00000000  1
00000000  1
00000000  1
00000000  1
00000000  1
00000000  1  (*
00000000  1                            *********************
00000000  1                            ***** SET_SIG_ *****
00000000  1                            *********************
00000000  1                                                                        *)
```

```
00000000 1 PROCEDURE SET_SIG_ ( SIG:  L_INT ); EXTERNAL;
00000000 1 (*
00000000 1   Procedure SET_SIG_ to set a signal indicator in the current process.
00000000 1   Provided as part of the operating system.
00000000 1                                                                        *)
00000000 1
00000000 1
00000000 1
00000000 1
00000000 1
00000000 1 (*
00000000 1                          **********************
00000000 1                          ***** READ_SIG_ *****
00000000 1                          **********************
00000000 1                                                                        *)
00000000 1 PROCEDURE READ_SIG_ ( ID:  S_INT; VAR SIG:  L_INT ); EXTERNAL;
00000000 1 (*
00000000 1   Procedure READ_SIG_ to read the signal indicator of the given
00000000 1   process.  Provided as part of the operating system.
00000000 1                                                                        *)
00000000 1
00000000 1
00000000 1
00000000 1
00000000 1
00000000 1 (*
00000000 1                          **********************
00000000 1                          ***** READ_PID_ *****
00000000 1                          **********************
00000000 1                                                                        *)
00000000 1 PROCEDURE READ_PID_ ( VAR PID:  S_INT ); EXTERNAL;
00000000 1 (*
00000000 1   Procedure READ_PID_ to return the current process' parent I.D.
00000000 1   Provided as part of the operating system.
00000000 1                                                                        *)
00000000 1
00000000 1
00000000 1
00000000 1
00000000 1
00000000 1 (*
00000000 1                          ******************
00000000 1                          ***** SLEEP_ *****
00000000 1                          ******************
00000000 1                                                                        *)
00000000 1 PROCEDURE SLEEP_ ( CHAN:  L_INT; PRI:  S_INT ); EXTERNAL;
00000000 1 (*
00000000 1   Procedure SLEEP_ to put a process to sleep ( ie suspended state )
00000000 1   until a certain signal is received.  Provided as part of the
00000000 1   operating system.
00000000 1
00000000 1
00000000 1
00000000 1
00000000 1
00000000 1
00000000 1 (*
00000000 1                          *****************
00000000 1                          ***** EXIT_ *****
00000000 1                          *****************
00000000 1                                                                        *)
00000000 1 PROCEDURE EXIT_; EXTERNAL;
00000000 1 (*
00000000 1   Procedure EXIT_ to remove a process from further execution:
00000000 1   its status is set in limbo.  Provided as part of the operating system.
00000000 1                                                                        *)
00000000 1
00000000 1
00000000 1
00000000 1
00000000 1
00000000 1 (*
00000000 1                          ***********************
00000000 1                          ***** EMUL_STATUS *****
00000000 1                          ***********************
```

```
00000000 1                                                                   *)
00000000 1  PROCEDURE EMUL_STATUS ( NUM_TRIES:  S_INT; VAR STATUS_CODE:  S_INT );
00000000 2                          EXTERNAL;
00000000 1  (*
00000000 1    Procedure EMUL_STATUS to see if the emulation monitor is out there
00000000 1    in emulation land.  Provided as part of the message handler.
00000000 1                                                                   *)
00000000 1
00000000 1
00000000 1
00000000 1
00000000 1
00000000 1  (*
00000000 1                       **************************
00000000 1                       ***** O_APPLY_BREAK *****
00000000 1                       **************************
00000000 1                                                                   *)
00000000 1  PROCEDURE O_APPLY_BREAK; EXTERNAL;
00000000 1  (*
00000000 1    Procedure O_APPLY_BREAK to break the emulator, ie put it in the
00000000 1    monitor.  Provided as part of the message handler.
00000000 1                                                                   *)
00000000 1
00000000 1
00000000 1
00000000 1
00000000 1
00000000 1  (*
00000000 1                             ****************
00000000 1                             ***** RUN *****
00000000 1                             ****************
00000000 1                                                                   *)
00000000 1  PROCEDURE RUN ( ADRS:  L_INT; FFROM:  S_INT; VAR ERROR:  S_INT );
00000000 2                EXTERNAL;
00000000 1  (*
00000000 1    Procedure RUN to restart the emulator after a break has occurred.
00000000 1    Provided as part of the message handler.
00000000 1                                                                   *)
00000000 1
00000000 1
00000000 1
00000000 1
00000000 1
00000000 1  (*
00000000 1                       **************************
00000000 1                       ***** TRANS_MEAS_IN *****
00000000 1                       **************************
00000000 1                                                                   *)
00000000 1  PROCEDURE TRANS_MEAS_IN ( VAR TOTAL_MEAS:  TOTAL_MEAS_REC; VAR
00000000 2                            SYM_STRUCT:  SYM_DESCRIPS; VAR HEAD_PTR:
00000000 2                            TRACE_SPEC_PTR; VAR RET_CODE:  S_INT );
00000000 2                            EXTERNAL;
00000000 1  (*
00000000 1    Procedure TRANS_MEAS_IN to determine what type of measurement is to
00000000 1    be run, then initiate the translation of the measurement description
00000000 1    into an equivalent hardware description.  Provided as a Pascal
00000000 1    external.
00000000 1                                                                   *)
00000000 1
00000000 1
00000000 1
00000000 1
00000000 1
00000000 1  (*
00000000 1                       ***************************
00000000 1                       ***** TRANS_SPEC_OUT *****
00000000 1                       ***************************
00000000 1                                                                   *)
00000000 1  PROCEDURE TRANS_SPEC_OUT ( VAR TOTAL_MEAS:  TOTAL_MEAS_REC; VAR
00000000 2                             SYM_STRUCT:  SYM_DESCRIPS; VAR FLG_ARRAY:
00000000 2                             FLAG_ARRAY_TYPE; MAC:  S_INT; VAR TRACE_SPEC:
00000000 2                             TRACE_SPEC_REC; VAR UNLOAD_COUNTER, RET_CODE:
00000000 2                             S_INT ); EXTERNAL;
00000000 1  (*
```

```
00000000 1   Procedure TRANS_SPEC_OUT to initiate the actual unloading of the
00000000 1   hardware.  It determines what type of specification was run, then
00000000 1   initiates the appropriate specification post-processor to unload the
00000000 1   hardware, to do any necessary garbage filtering, and to create valid
00000000 1   trace file data records from the hardware data.  Provided as a
00000000 1   Pascal external.
00000000 1                                                                 *)
00000000 1
00000000 1
00000000 1
00000000 1
00000000 1
00000000 1  (*
00000000 1                          ****************************
00000000 1                          ***** TRANS_MAC_ADRS *****
00000000 1                          ****************************
00000000 1                                                                 *)
00000000 1  FUNCTION TRANS_MAC_ADRS ( UNLOADER:  UN_TYPES; UNLOAD_COUNTER:  S_INT ):
00000000 2                              S_INT; EXTERNAL;
00000000 1  (*
00000000 1   Function TRANS_MAC_ADRS to determine the starting memory address
00000000 1   counter which should be used for the next trace.  Provided as a
00000000 1   Pascal external.
00000000 1                                                                 *)
00000000 1
00000000 1
00000000 1
00000000 1
00000000 1
00000000 1  %CALL_PC_SHORTS
00000000 1  (*
00000000 1                          ***************************
00000000 1                          ***** BUILD_SYM_TAB *****
00000000 1                          ***************************
00000000 1                                                                 *)
00000000 1  PROCEDURE BUILD_SYM_TAB ( VAR MEAS_STRUCT:  CMD_DATA_ARRAY; VAR
00000000 2                              SYM_STRUCT:  SYM_DESCRIPS ); EXTERNAL;
00000000 1  (*
00000000 1   Procedure BUILD_SYM_TAB to build a symbol table from all the
00000000 1   unique symbols in the measurement structure.  Provided as a Pascal
00000000 1   external.
00000000 1                                                                 *)
00000000 1
00000000 1
00000000 1
00000000 1
00000000 1
00000000 1  (*
00000000 1                          ***************************
00000000 1                          ***** GET_NEXT_SPEC *****
00000000 1                          ***************************
00000000 1                                                                 *)
00000000 1  FUNCTION GET_NEXT_SPEC:  TRACE_SPEC_PTR; EXTERNAL;
00000000 1  (*
00000000 1   Function GET_NEXT_SPEC to search through the linked list of trace
00000000 1   specifications and find the one with the highest priority ready to
00000000 1   go.  Provided as a Pascal external.
00000000 1                                                                 *)
00000000 1
00000000 1
00000000 1
00000000 1
00000000 1
00000000 1  (*
00000000 1                             ********************
00000000 1                             ***** SET_SPEC *****
00000000 1                             ********************
00000000 1                                                                 *)
00000000 1  PROCEDURE SET_SPEC ( PRI:  S_INT; SET_STATUS:  SPEC_STATUS ); EXTERNAL;
00000000 1  (*
00000000 1   Procedure SET_SPEC to set the status of a trace specification.
00000000 1   Provided as a Pascal external.
00000000 1                                                                 *)
00000000 1
```

```
00000000  1
00000000  1
00000000  1
00000000  1
00000000  1  (*
00000000  1                          ************************
00000000  1                          ***** START_FOOTDC *****
00000000  1                          ************************
00000000  1                                                                   *)
00000000  1  PROCEDURE START_FOOTDC ( VAR TOTAL_MEAS:  TOTAL_MEAS_REC; VAR SYMBOLS:
00000000  2                          SYM_DESCRIPS; VAR RET_CODE:  S_INT ); EXTERNAL;
00000000  1  (*
00000000  1    Procedure START_FOOTDC to initiate creation of the trace file
00000000  1    and write out the header record, the command and configuration
00000000  1    records, and the symbol records.  Provided as a Pascal external.
00000000  1                                                                   *)
00000000  1
00000000  1
00000000  1
00000000  1
00000000  1
00000000  1  (*
00000000  1                         *************************
00000000  1                         ***** WRITE_MSG_REC *****
00000000  1                         *************************
00000000  1                                                                   *)
00000000  1  PROCEDURE WRITE_MSG_REC ( D_TYPE, MSG_NO:  S_INT; VAR REC_COUNT,
00000000  2                           FNGR_CODE:  S_INT ); EXTERNAL;
00000000  1  (*
00000000  1    Procedure WRITE_MSG_REC to write a display message record out to the
00000000  1    trace file.  Provided as a Pascal external.
00000000  1                                                                   *)
00000000  1
00000000  1
00000000  1
00000000  1
00000000  1
00000000  1  (*
00000000  1                          *************************
00000000  1                          ***** FINISH_FOOTDC *****
00000000  1                          *************************
00000000  1                                                                   *)
00000000  1  PROCEDURE FINISH_FOOTDC ( VAR FNGR_CODE:  S_INT ); EXTERNAL;
00000000  1  (*
00000000  1    Procedure FINISH_FOOTDC to write out the end of data record and close
00000000  1    the trace file.  Provided as a Pascal external.
00000000  1                                                                   *)
00000000  1
00000000  1
00000000  1
00000000  1
00000000  1
00000000  1  (*
00000000  1                            *******************
00000000  1                            ***** LOAD_HW *****
00000000  1                            *******************
00000000  1                                                                   *)
00000000  1  PROCEDURE LOAD_HW ( VAR SPEC:  HW_SPEC_REC; VAR CNTRL_ARRAY:
00000000  2                      CNTRL_ARRAY_TYPE ); EXTERNAL;
00000000  1  (*
00000000  1    Procedure LOAD_HW to load the Soda hardware set with the given
00000000  1    hardware specification.  Provided as a Pascal external.
00000000  1                                                                   *)
00000000  1
00000000  1
00000000  1
00000000  1
00000000  1
00000000  1  (*
00000000  1                             ******************
00000000  1                             ***** RUN_HW *****
00000000  1                             ******************
00000000  1                                                                   *)
```

```
00000000  1  PROCEDURE RUN_HW ( VAR CNTRL_ARRAY:  CNTRL_ARRAY_TYPE ); EXTERNAL;
00000000  1  (*
00000000  1    Procedure RUN_HW to start the hardware running.  Provided as a
00000000  1    Pascal external.
00000000  1                                                                      *)
00000000  1
00000000  1
00000000  1
00000000  1
00000000  1
00000000  1  (*
00000000  1                       ***********************
00000000  1                       ***** MONITOR_HW *****
00000000  1                       ***********************
00000000  1                                                                      *)
00000000  1  PROCEDURE MONITOR_HW ( VAR FLG_ARRAY:  FLAG_ARRAY_TYPE; VAR MAC:
00000000  2                        S_INT ); EXTERNAL;
00000000  1  (*
00000000  1    Procedure MONITOR_HW to read all current hardware flags.  Provided
00000000  1    as a Pascal external.
00000000  1                                                                      *)
00000000  1
00000000  1
00000000  1
00000000  1
00000000  1
00000000  1  (*
00000000  1                       ********************
00000000  1                       ***** HALT_HW *****
00000000  1                       ********************
00000000  1                                                                      *)
00000000  1  PROCEDURE HALT_HW ( VAR CNTRL_ARRAY:  CNTRL_ARRAY_TYPE; VAR FLG_ARRAY:
00000000  2                     FLAG_ARRAY_TYPE; VAR MAC:  S_INT ); EXTERNAL;
00000000  1  (*
00000000  1    Procedure HALT_HW to halt the hardware:  stop a run.  Procedure also
00000000  1    reads all hardware flags and the memory address counter.  Provided
00000000  1    as a Pascal external.
00000000  1                                                                      *)
00000000  1
00000000  1
00000000  1
00000000  1
00000000  1
00000000  1  (*
00000000  1                       *********************
00000000  1                       ***** LOAD_MSG *****
00000000  1                       *********************
00000000  1                                                                      *)
00000000  1  PROCEDURE LOAD_MSG ( FIRST:  BOOLEAN ); EXTERNAL;
00000000  1  (*
00000000  1    Procedure LOAD_MSG to put up the loading message   Provided as a
00000000  1    Pascal external.
00000000  1                                                                      *)
00000000  1
00000000  1
00000000  1
00000000  1
00000000  1
00000000  1  (*
00000000  1                       ********************
00000000  1                       ***** RUN_MSG *****
00000000  1                       ********************
00000000  1                                                                      *)
00000000  1  PROCEDURE RUN_MSG ( VAR FLG_ARRAY:  FLAG_ARRAY_TYPE; VAR TRACE_SPEC:
00000000  2                     TRACE_SPEC_REC; STATE, RECS:  S_INT; RT_FLAG:
00000000  2                     BOOLEAN ); EXTERNAL;
00000000  1  (*
00000000  1    Procedure RUN_MSG to update the current run message appropriately.
00000000  1    Provided as a Pascal external.
00000000  1                                                                      *)
00000000  1
00000000  1
00000000  1
00000000  1
```

```
00000000 1
00000000 1 (*
00000000 1                     *********************
00000000 1                     ***** EXIT_MSG *****
00000000 1                     *********************
00000000 1                                                         *)
00000000 1 PROCEDURE EXIT_MSG ( CODE, RECS:  S_INT ), EXTERNAL;
00000000 1 (*
00000000 1   Procedure EXIT_MSG to put up the appropriate final status/error
00000000 1   message.  Provided as a Pascal external.
00000000 1                                                         *)
00000000 1
00000000 1
00000000 1
00000000 1
00000000 1
00000000 1 (*
00000000 1                   *************************
00000000 1                   ***** TEST_FEATURE *****
00000000 1                   *************************
00000000 1                                                         *)
00000000 1 FUNCTION TEST_FEATURE ( VAR FEAT_SIG:  FEATURE_REC ):  CONDITION_TYPE;
00000001 2                   EXTERNAL;
00000000 1 (*
00000000 1   Function TEST_FEATURE to test to see if a given feature is turned
00000000 1   on or not.  Provided as a Pascal external.
00000000 1                                                         *)
00000000 1
00000000 1
00000000 1
00000000 1
00000000 1
00000000 1 (*
00000000 1                   **************************
00000000 1                   ***** DISABLE_CHECK *****
00000000 1                   **************************
00000000 1                                                         *)
00000000 1 FUNCTION DISABLE_CHECK ( VAR STOP_PTR:  CMD_ARRAY_PTR; VAR FLAGS:
00000000 2                   FLAG_ARRAY_TYPE; MAC:  S_INT; VAR TRACE_SPEC:
00000000 2                   TRACE_SPEC_REC ):  BOOLEAN; EXTERNAL;
00000000 1 (*
00000000 1   Function DISABLE_CHECK to check for the final disable condition.
00000000 1   Provided as a Pascal external.
00000000 1                                                         *)
00000000 1
00000000 1
00000000 1
00000000 1
00000000 1
00000000 1 (*
00000000 1                       *****************
00000000 1                       ***** WAIT *****
00000000 1                       *****************
00000000 1                                                         *)
00000000 1 PROCEDURE WAIT ( WHAT_STATUS:  L_INT );
00000004 2 (*
00000004 2   Procedure WAIT to wait until it is time to continue.  Procedure
00000004 2   simply tells the BPC and 68000 what is going on, then sleeps until
00000004 2   awakened.  It then returns to the caller.
00000004 2
00000004 2   WAIT uses the following routines:  SET_PRI_, SET_SIG_, and SLEEP_.
00000004 2
00000004 2   Input:  1) WHAT_STATUS, the hardware status to tell the BPC and 68000
00000004 2   Output:  none
00000004 2                                                         *)
00000004 2 BEGIN (* Procedure WAIT *)
00000004 2   SET_PRI_ ( PRCSS_HI_PRI ); (* Prevent race condition *)
00000010 2   HOWS_IT_GOING.HARDWARE_STATUS := WHAT_STATUS; (* Tell BPC *)
00000018 2   SET_SIG_ ( WHAT_STATUS ); (* Tell 68000 *)
00000022 2   SLEEP_ ( DYNAMIC_CHANL, PRCSS_LO_PRI ) (* Nod off *)
00000032 2 END; (* Procedure WAIT *)
00000000 1
00000000 1
00000000 1
```

```
00000000  1
0000000C  1
00000000  1  (*
00000000  1                          ********************
00000000  1                          ***** MY_EXIT *****
00000000  1                          ********************
00000000  1                                                                     *)
00000000  1  PROCEDURE MY_EXIT ( EXIT_CODE:  S_INT );
00000000  2  (*
00000000  2    Procedure MY_EXIT to clean up and exit the Dynamic Controller
00000000  2    process.  Procedure issues a message based on the code passed
00000000  2    to it, RELEASEs all memory MARKed with DVM_PTR, sets the process
00000000  2    signal appropriately, then exits into nothingness.
00000000  2
00000000  2    MY_EXIT uses the following routines:  SET_PRI_, SET_SIG_, EXIT_,
00000000  2    FINISH_FOOTDC, HALT_HW, and EXIT_MSG.
00000000  2
00000000  2    Input:  1) EXIT_CODE, the code specifying what error message, if any, is
00000000  2               to be output:
00000000  2               = -100 indicates error but no message
00000000  2               = -99 to -1 indicates Dynamic Controller error message
00000000  2               = 0 indicates no error and no message
00000000  2               = 1 to 9 indicates file manager error message
00000000  2               = 14 indicates halted status message
00000000  2               = 15 indicates completed status message
00000000  2               = 16 indicates stopped status message
00000000  2    Output:  none ( procedure doesn't return )
00000000  2                                                                     *)
00000000  2  VAR
00000000  2
00000000  2    FINISH_CODE:  S_INT; (* Return code from FINISH_FOOTDC *)
00000002  2
00000002  2    FINAL_STATUS:  S_INT; (* Final Controller status *)
00000004  2
00000004  2    MAC:  S_INT; (* Memory address counter *)
0000003A  2
0000003A  2  BEGIN (* Procedure MY_EXIT *)
0000003A  2    (* Output an appropriate farewell message *)
0000003A  2    EXIT_MSG ( EXIT_CODE, MEM_UNLD_CNTR );
00000048  2    (* Raise priority to make sure the exit goes through after the flag
00000048  2       is set *)
00000048  2    SET_PRI_ ( PRCSS_HI_PRI );
00000054  2
00000054  2    CASE EXIT_CODE OF
0000005E  2      14:  (* Measurement was halted *)
0000005E  2        FINAL_STATUS := HALTED;
00000068  2      0,15,16:  (* Measurement completed or stopped *)
00000068  2        FINAL_STATUS := COMPLETED;
00000072  2      OTHERWISE (* Something very, very BAD happened *)
00000072  2        BEGIN (* Tell papa things fell apart *)
00000072  2          (* Make sure hardware is halted *)
00000072  2          HALT_HW ( CONTROL_ARRAY, FLAG_ARRAY, MAC );
00000088  2          (* Make sure trace file is closed *)
00000088  2          FINISH_FOOTDC ( FINISH_CODE );
00000092  2          IF FINISH_CODE = 3
0000009E  2            THEN (* File did not exist *)
0000009E  2              FINAL_STATUS := CATASTROPHE (* No new data *)
000000A8  2            ELSE (* File did exist *)
000000A8  2              FINAL_STATUS := SEMI_CATAST (* There is new data *)
000000AE  2        END (* Tell papa things fell apart *)
000000AE  2    END; (* Of case statement *)
000000CC  2
000000CC  2    RELEASE ( DVM_PTR );
000000D8  2
000000D8  2    (* Tell BPC *)
000000D8  2    IF FINAL_STATUS = SEMI_CATAST
000000E4  2      THEN (* Semi-problem *)
000000E4  2        HOWS_IT_GOING.HARDWARE_STATUS := HALTED (* Lie a little *)
000000EE  2      ELSE (* Either O.K. or bad problem *)
000000EE  2        HOWS_IT_GOING.HARDWARE_STATUS := FINAL_STATUS;
000000F4  2
```

```
000000F4  2    (* Tell 68000 *)
000000F4  2    IF ( MEM_UNLD_CNTR = 0 ) AND ( FINAL_STATUS <> CATASTROPHE )
00000112  2      THEN (* Don't want to display any data *)
00000112  2        SET_SIG_ ( NO_DATA )
00000124  2      ELSE (* Return actual status *)
00000124  2        SET_SIG_ ( FINAL_STATUS );
00000134  2    EXIT_
0000013A  2  END; (* Procedure MY_EXIT *)
00000000  1
00000000  1
00000000  1
00000000  1
00000000  1
00000000  1  (*
00000000  1                               *********************
00000000  1                               ***** MY_ENTRY *****
00000000  1                               *********************
00000000  1                                                                        *)
00000000  1  PROCEDURE MY_ENTRY ( VAR TOTAL_MEAS:  TOTAL_MEAS_REC; VAR CARE_PTR:
00000000  2                       PARAMETER_PTR );
00000000  2  (*
00000000  2    Procedure MY_ENTRY to enter the Dynamic Controller process.
00000000  2    Procedure sets the process signal appropriately, MARKs all
00000000  2    memory with DYN_PTR, then obtains all input parameters necessary
00000000  2    for the trace.
00000000  2
00000000  2    Note:  MY_ENTRY is a first level routine, so it can and will call
00000000  2           MY_EXIT if an error occurs.  This means under certain
00000000  2           conditions it never returns!
00000000  2
00000000  2    MY_ENTRY uses the following routines:  SET_PRI_, SET_SIG_, READ_SIG_,
00000000  2    READ_PID_, and HALT_HW.
00000000  2
00000000  2    Input:  none
00000000  2    Output:  1) TOTAL_MEAS, a record describing the entire measurement
00000000  2                to be taken
00000000  2             2) CARE_PTR, a pointer to the structure for communication
00000000  2                with the user
00000000  2                                                                        *)
00000000  2  VAR
00000000  2
00000000  2    MAC:  S_INT; (* Memory address counter *)
00000002  2
00000002  2    PID:  S_INT; (* I.D. of parent process *)
00000004  2
00000004  2    PSIG:  L_INT; (* Signal of parent process *)
00000142  2
00000142  2  BEGIN (* Procedure MY_ENTRY *)
00000142  2
00000142  2    (* Initialize *)
00000142  2
00000142  2    HOWS_IT_GOING.HARDWARE_STATUS := LOADING; (* Tell BPC I'm here *)
00000148  2    SET_SIG_ ( LOADING ); (* Tell 68000 I'm here *)
00000156  2    SET_PRI_ ( PRCSS_LO_PRI ); (* Set my priority to non-critical *)
00000160  2    MARK ( DYN_PTR ); (* Remember where I started NEWing everything *)
0000016C  2    (* Stop the monstrosity *)
0000016C  2    HALT_HW ( CONTROL_ARRAY, FLAG_ARRAY, MAC );
00000182  2
00000182  2    (* Find out who my parent is and get input parameters *)
00000182  2
00000182  2    READ_PID_ ( PID );
0000018E  2    READ_SIG_ ( PID, PSIG );
0000019E  2    (* Do under-the-table type changes *)
0000019E  2    CARE_PTR := PARAMETER_PTR ( PSIG );
000001A6  2    WITH TOTAL_MEAS DO
000001AE  2      BEGIN (* Transfer input stuff to my record *)
000001AE  2        START_PTR := CMD_ARRAY_PTR ( CARE_PTR^.ENA_STACK_PTR );
000001B8  2        STOP_PTR := CMD_ARRAY_PTR ( CARE_PTR^.DIS_STACK_PTR );
000001C8  2        MEAS_PTR := CMD_ARRAY_PTR ( CARE_PTR^.CMD_STACK_PTR );
000001D8  2        CMD_PTR := CMD_REC_PTR ( CARE_PTR^.COMMAND_PTR );
000001E8  2        CONFIG_PTR := CONFIG_REC_PTR ( CARE_PTR^.CONFIG_PTR )
000001F8  2      END (* Transfer input stuff to my record *)
000001F8  2  END; (* Procedure MY_ENTRY *)
00000000  1
```

```
00000000 1
00000000 1
00000000 1
00000000 1
00000000 1  (*
00000000 1                          ******************
00000000 1                          ***** DO_RUN *****
00000000 1                          ******************
00000000 1                                                                  *)
00000000 1  PROCEDURE DO_RUN ( VAR TRACE_SPEC:  TRACE_SPEC_REC; VAR CONFIG:
00000000 2                 CONFIG_REC_TYPE; CARE_PTR:  PARAMETER_PTR; FIRST_TRY:
00000000 2                 BOOLEAN; MUC:  S_INT; VAR SAC, MAC:  S_INT; VAR
00000000 2                 UCMD:  L_INT );
00000000 2  (*
00000000 2
00000000 2    Procedure DO_RUN to accomplish the running of a trace specification.
00000000 2    Procedure is responsible for the loading, running, monitoring, and
00000000 2    halting of a trace specification.
00000000 2
00000000 2    Note:  DO_RUN is a first level routine, so it can and will call
00000000 2          MY_EXIT if an error occurs.  This means under certain
00000000 2          conditions it never returns!
00000000 2
00000000 2    DO_RUN uses the following routines:  WAIT, MY_EXIT, SET_SIG_,
00000000 2    EMUL_STATUS, O_APPLY_BREAK, RUN, LOAD_HW, RUN_HW, MONITOR_HW, HALT_HW,
00000000 2    LOAD_MSG, and RUN_MSG.
00000000 2
00000000 2    Input:  1) TRACE_SPEC, the trace spec that is to be run
00000000 2            2) CONFIG, the configuration of the instrument
00000000 2            3) CARE_PTR, a pointer to the structure for communication
00000000 2               with the user
00000000 2            4) FIRST_TRY, a flag indicating if this is the first trace
00000000 2               spec ( TRUE ) or not ( FALSE )
00000000 2            5) MUC, the memory unload counter
00000000 2            6) SAC, the saved address counter
00000000 2    Output:  1) SAC, the updated saved address counter after the hardware
00000000 2                has been halted
00000000 2             2) MAC, the memory address counter after the hardware has
00000000 2                been halted
00000000 2             3) UCMD, the user command at the time the trace was halted
00000000 2                                                                  *)
00000000 2  VAR
00000000 2
00000000 2    EMC:  S_INT; (* Return code for emulation/exit code *)
00000200 2
00000200 2  BEGIN (* Procedure DO_RUN *)
00000200 2    EMC := 1; (* Initialize so when msg hndlr is not there, code
00000206 2                 will be right *)
00000206 2
00000206 2    (* Load the hardware *)
00000206 2
00000206 2    LOAD_MSG ( FIRST_TRY );
00000210 2    LOAD_HW ( TRACE_SPEC.HW_SPEC, CONTROL_ARRAY );
00000222 2    IF FIRST_TRY = TRUE
0000022E 2      THEN (* First time through:  wait until its safe to continue *)
0000022E 2        WAIT ( LOADED );
0000023A 2
0000023A 2    (* Get the emulator going and fire this sucker up *)
0000023A 2
0000023A 2    IF ( FIRST_TRY = FALSE ) OR ( CONFIG.RUN_AT_EXEC = TRUE )
00000260 2      THEN (* I am responsible for starting the emulator *)
00000260 2        BEGIN (* Start the hardware, then the emulator *)
00000260 2          EMUL_STATUS ( -16, EMC );
00000270 2          IF EMC = 1
0000027C 2            THEN (* Need to stop emulator *)
0000027C 2              O_APPLY_BREAK;
00000282 2          RUN_HW ( CONTROL_ARRAY ); (* Start hardware *)
0000028C 2          IF FIRST_TRY = TRUE
00000298 2            THEN (* Fire up first time *)
00000298 2              RUN ( CONFIG.RUN_ADRS, S_INT ( CONFIG.RUN_CMD ), EMC )
000002BC 2            ELSE (* Restart *)
000002BC 2              RUN ( 0, 0, EMC );
```

```
000002D0  2          IF EMC <> 0
000002D8  2            THEN (* Emulation suddenly disappeared *)
000002D8  2              BEGIN (* Exit with correct error code *)
000002D8  2                IF EMC = 2
000002E4  2                  THEN (* No monitor *)
000002E4  2                    EMC := NO_MONITOR
000002EE  2                  ELSE (* 1:  No xfer address because no file loaded *)
000002EE  2                    EMC := NO_XFR_ADRS;
000002F4  2                MY_EXIT ( EMC )
000002FE  2              END (* Exit with correct error code *)
000002FE  2        END (* Start the hardware, then the emulator *)
00000302  2      ELSE (* I don't have to do anything to the emulator *)
00000302  2        RUN_HW ( CONTROL_ARRAY ); (* Just start the hardware *)
0000030C  2
0000030C  2    (* Tell the world what's going on *)
0000030C  2
0000030C  2    IF CONFIG.REAL_TIME = TRUE
0000031C  2      THEN (* This is real-time measurement *)
0000031C  2        HOWS_IT_GOING.HARDWARE_STATUS := RUNNING_RT
00000326  2      ELSE (* This is non-real-time measurement *)
00000326  2        HOWS_IT_GOING.HARDWARE_STATUS := RUNNING_NRT;
0000032C  2    SET_SIG_ ( HOWS_IT_GOING.HARDWARE_STATUS );
0000033C  2
0000033C  2    (* Wait for measurement complete, user halt, or emul goof *)
0000033C  2
0000033C  2    REPEAT (* Sleep a lot *)
0000033C  2      MONITOR_HW ( FLAG_ARRAY, MAC );
0000034C  2      IF NOT ( MEM_NOT_FULL_BIT IN FLAG_1_SET ( FLAG_ARRAY [ FLAG_1 ] ) )
0000035C  2        THEN (* Memory full:  MAC has wrapped *)
0000035C  2          MAC := 4096; (* Hard-wire the amount *)
00000364  2      RUN_MSG ( FLAG_ARRAY, TRACE_SPEC, SAC+MAC-TRACE_SPEC.HW_SPEC.
00000364  2                START_MAC, MUC, CONFIG.REAL_TIME );
0000039A  2      EMUL_STATUS ( 1, EMC );
000003AA  2      UCMD := CARE_PTR^.ACTION
000003B4  2    (* Loop until hardware stops or user hits halt or emulation status
000003B4  2       indicates something other than in monitor with no error, running,
000003B4  2       or reset *)
000003B4  2    UNTIL ( STOP_BIT IN FLAG_1_SET ( FLAG_ARRAY [ FLAG_1 ] ) ) OR
000003B4  2         ( UCMD <> EXECUTE ) OR ( ( EMC <> 0 ) AND ( EMC <> 1 ) AND
000003B4  2         ( EMC <> 5 ) );
00000404  2
00000404  2    (* Pull the plug on all this fun *)
00000404  2    IF STOP_BIT IN FLAG_1_SET ( FLAG_ARRAY [ FLAG_1 ] )
0000040E  2      THEN (* Hardware did complete *)
0000040E  2        BEGIN (* Wait if we're real-time *)
0000040E  2          IF CONFIG.REAL_TIME = TRUE
0000041E  2            THEN (* Real-time:  wait for safe unload *)
0000041E  2              WAIT ( COMP_UNLOAD )
0000042A  2        END (* Wait if we're real-time *)
0000042E  2      ELSE (* Hardware did not complete:  halt or error *)
0000042E  2        BEGIN (* Don' wait *)
0000042E  2          HOWS_IT_GOING.HARDWARE_STATUS := HALT_UNLOAD; (* Tell BPC *)
00000434  2          SET_SIG_ ( HALT_UNLOAD ) (* Tell 68000 *)
00000442  2        END;  (* Don' wait *)
00000442  2
00000442  2    CARE_PTR^.ACTION := EXECUTE; (* Reset user cmd to monitor unload *)
0000044C  2    HALT_HW ( CONTROL_ARRAY, FLAG_ARRAY, MAC );
00000464  2    IF MAC > 1
00000472  2      THEN (* Memory did not wrapped *)
00000472  2        SAC := SAC + MAC - TRACE_SPEC.HW_SPEC.START_MAC
00000488  2  END; (* Procedure DO_RUN *)
00000000  1
00000000  1
00000000  1
00000000  1
00000000  1
00000000  1  (*
00000000  1                        **********************
00000000  1                        ***** DYN_PRCSS *****
00000000  1                        **********************
00000000  1                                                                  *)
00000000  1  $GLOBPROC ON$
00000000  1  PROCEDURE DYN_PRCSS;
00000000  2  (*
```

```
00000000  2    Here it is.  The routine does all that was promised at the beginning.
00000000  2    It also initiates the outputting of status messages when appropriate.
00000000  2    If there is a fatal load/unload error along the way, the process will
00000000  2    initiate the issuing of an error message and terminate itself.
00000000  2
00000000  2    DYN_PRCSS uses the following routines:  MY_EXIT, MY_ENTRY, DO_RUN
00000000  2    EMUL_STATUS, TRANS_MEAS_IN, TRANS_SPEC_OUT, TRANS_MAC_ADRS,
00000000  2    BUILD_SYM_TAB, GET_NEXT_SPEC, SET_SPEC, START_FOOTDC, WRITE_MSG_REC,
00000000  2    FINISH_FOOTDC, TEST_FEATURE, and DISABLE_CHECK.
00000000  2
00000000  2    Input:  none
00000000  2
00000000  2            The parent signal is read to obtain input parameters and to
00000000  2            report status.  Basically, there are five pointers that
00000000  2            are of concern:  one to a command description, one to a
00000000  2            configuration description, one to a measurement description,
00000000  2            one to an enable description, and finally, one to a disable
00000000  2            description.  A -1 in the action field indicates an abort.
00000000  2
00000000  2    Output:  none
00000000  2
00000000  2             The hardware status field is used to report status to the
00000000  2             BPC, the process signal is used for the 68000, with the
00000000  2             following meanings:
00000000  2              -3 indicates no data was captured
00000000  2              -2 indicates a semi-fatal error has occurred
00000000  2              -1 indicates a fatal error has occurred
00000000  2               1 indicates hardware is being loaded
00000000  2               2 indicates the hardware is running real-time
00000000  2               3 indicates the hardware is running non-real-time
00000000  2               4 indicates the hardware was halted
00000000  2               5 indicates the hardware completed the measurement
00000000  2               6 indicates the hardware stopped ( should never happed )
00000000  2               7 indicates the hardware is loaded
00000000  2               8 indicates the hardware was halted and is being unloaded
00000000  2               9 indicates the hardware is completed and ready to unload
00000000  2                                                                         *)
00000000  2  VAR
00000000  2
00000000  2    MEM_ADRS_CNTR:  S_INT; (* Memory address counter *)
00000002  2
00000002  2    SAVED_ADRS_CNTR:  S_INT; (* Saved address counter between runs *)
00000004  2
00000004  2    RETURN_CODE:  S_INT; (* Return code from other routines *)
00000006  2
00000006  2    TOTAL_MSRMNT:  TOTAL_MEAS_REC; (* Input structure describing all
0000001A  2                                      aspects of the measurement to be
0000001A  2                                      made, ie start/sequence/stop,
0000001A  2                                      actual measurnent, command, and
0000001A  2                                      configuration *)
0000001A  2
0000001A  2    CURRENT_SPEC:  TRACE_SPEC_PTR; (* Pointer to current trace spec *)
0000001E  2
0000001E  2    EMUL_TRIES:  S_INT; (* # tries to check EMUL_STATUS *)
00000020  2
00000020  2    EMUL_CODE:  S_INT; (* Return code from the emulator subsystem *)
00000022  2
00000022  2    USER_CMD:  L_INT; (* User requested action *)
00000026  2
00000026  2    FIRST_TIME:  BOOLEAN; (* Flag indicating first time through WHILE
00000027  2                            loop *)
00000027  2
00000027  2    BREAK_FLAG:  CONDITION_TYPE; (* Condition of break on stop *)
00000490  2
00000490  2  BEGIN (* DYN_PRCSS *)
00000490  2    RETURN_CODE := NO_ERROR; (* Set it just to be on the safe side *)
00000494  2    EMUL_CODE := 1; (* Initialize so when msg hndlr is not there, code
0000049A  2                       will be right *)
0000049A  2
0000049A  2    (* Initialize and get input parameters *)
0000049A  2
0000049A  2    MY_ENTRY ( TOTAL_MSRMNT, CARE_PACKAGE );
000004A8  2
```

```
000004A8  2   (* Build a table containing all unique symbols *)
000004A8  2
000004A8  2   BUILD_SYM_TAB ( TOTAL_MSRMNT.MEAS_PTR^, SYMBOL_TABLE );
000004B8  2   IF SYMBOL_TABLE.SYMBOL_COUNT > MAX_SYMS
000004C4  2     THEN (* Too many symbols *)
000004C4  2       MY_EXIT ( CORRUPT_USER ); (* Leave loudly *)
000004CE  2
000004CE  2   (* Translate the user structures into hardware structures *)
000004CE  2
000004CE  2   TRANS_MEAS_IN ( TOTAL_MSRMNT, SYMBOL_TABLE, TRACE_HEAD, RETURN_CODE );
000004EA  2   IF RETURN_CODE <> NO_ERROR
000004F2  2     THEN (* An error occurred *)
000004F2  2       MY_EXIT ( RETURN_CODE );
000004FC  2
000004FC  2   (* Start the trace file *)
000004FC  2
000004FC  2   START_FOOTOC ( TOTAL_MSRMNT, SYMBOL_TABLE, RETURN_CODE );
00000512  2   IF RETURN_CODE <> NO_ERROR
0000051A  2     THEN (* Get out while the getting is good *)
0000051A  2       MY_EXIT ( RETURN_CODE );
00000524  2
00000524  2   (* Set up variables before going into loop *)
00000524  2
00000524  2   BREAK_FLAG := OFF;
0000052A  2   USER_CMD := EXECUTE;
00000532  2   FIRST_TIME := TRUE;
00000538  2   SAVED_ADRS_CNTR := 0;
0000053C  2   MEM_UNLD_CNTR := 0;
00000540  2   CURRENT_SPEC := GET_NEXT_SPEC;
00000548  2
00000548  2   (* Now loop until done *)
00000548  2
00000548  2   WHILE ( CURRENT_SPEC <> NIL ) AND ( USER_CMD = EXECUTE ) DO
00000568  2     BEGIN (* Load next specification, run, check the hardware for halted
00000568  2             and for completed, unload, repeat *)
00000568  2
00000568  2       (* Turn spec on *)
00000568  2
00000568  2       SET_SPEC ( CURRENT_SPEC^.PRIORITY, ACTIVE );
00000578  2       BREAK_FLAG := TEST_FEATURE ( CURRENT_SPEC^.HW_SPEC.FEATURES
00000578  2                     [ BREAK_ON_STOP ] );
0000058E  2
0000058E  2       (* Do it *)
0000058E  2
0000058E  2       CURRENT_SPEC^.HW_SPEC.START_MAC :=
0000058E  2           TRANS_MAC_ADRS ( CURRENT_SPEC^.UM_REQUEST, MEM_UNLD_CNTR );
000005B0  2       IF CURRENT_SPEC^.HW_SPEC.START_MAC > 0
000005BC  2         THEN (* Can do the run *)
000005BC  2           BEGIN (* Run and unload *)
000005BC  2             DO_RUN ( CURRENT_SPEC^, TOTAL_MSRMNT.CONFIG_PTR^,
000005BC  2                     CARE_PACKAGE, FIRST_TIME, MEM_UNLD_CNTR,
000005BC  2                     SAVED_ADRS_CNTR, MEM_ADRS_CNTR, USER_CMD );
000005EA  2
000005EA  2             (* Unload all that we got *)
000005EA  2
000005EA  2             TRANS_SPEC_OUT ( TOTAL_MSRMNT, SYMBOL_TABLE, FLAG_ARRAY,
000005EA  2                              MEM_ADRS_CNTR, CURRENT_SPEC^,
000005EA  2                              MEM_UNLD_CNTR, RETURN_CODE );
00000614  2           END (* Run and unload *)
00000618  2         ELSE (* Can't do the run *)
00000618  2           RETURN_CODE := 5; (* Memory is full enough *)
0000061E  2
0000061E  2       CASE RETURN_CODE OF
00000628  2         NO_ERROR:  (* No error *)
00000628  2           IF MEM_UNLD_CNTR >= MAX_UNLD_COUNT
00000634  2             THEN (* Unloaded as much as we should *)
00000634  2               USER_CMD := COMPLETE
00000640  2             ELSE (* Haven't unloaded the max yet *)
00000640  2               IF ( USER_CMD <> EXECUTE ) OR
00000640  2                  ( CARE_PACKAGE^.ACTION <> EXECUTE )
00000660  2                 THEN (* User wants to quit *)
```

```
00000668  2                  USER_CMD := HALT
00000674  2                 ELSE (* Not completed or halted *)
00000674  2                  IF ( DISABLE_CHECK ( TOTAL_MSRMNT.STOP_PTR,
00000674  2                     FLAG_ARRAY, MEM_ADRS_CNTR, CURRENT_SPEC^ ) = TRUE )
00000698  2                   THEN (* We hit a disable *)
00000698  2                    USER_CMD := STOPP;
000006A4  2          5:  (* Out of trace memory:  quit gracefully *)
000006A4  2            USER_CMD := COMPLETE;
000006B0  2          OTHERWISE (* Some catastrophic error *)
000006B0  2            MY_EXIT ( RETURN_CODE )
000006BA  2        END; (* Of case statement *)
000006E4  2
000006E4  2        (* See if emulator really is here and for the right reason *)
000006E4  2
000006E4  2        IF ( STOP_BIT IN FLAG_1_SET ( FLAG_ARRAY [ FLAG_1 ] ) ) AND
000006E4  2           ( BREAK_FLAG = ON )
00000704  2          THEN (* Should be able to halt the emulator to check status *)
00000704  2            EMUL_TRIES := -16
0000070E  2          ELSE (* Don't try it *)
0000070E  2            EMUL_TRIES := 16;
00000714  2        EMUL_STATUS ( EMUL_TRIES, EMUL_CODE );
00000724  2        CASE EMUL_CODE OF
0000072E  2         -3:  (* Software break *)
0000072E  2            RETURN_CODE := ILL_SW_BREAK;
00000738  2          0:  (* In monitor *)
00000738  2            RETURN_CODE := NO_ERROR;
00000740  2          1:  (* Not in monitor *)
00000740  2            IF EMUL_TRIES < 0
00000748  2              THEN (* Should be in monitor *)
00000748  2                RETURN_CODE := NOT_IN_MONITOR
00000752  2              ELSE (* Shouldn't *)
00000752  2                RETURN_CODE := NO_ERROR;
0000075A  2          2:  (* No monitor *)
0000075A  2            RETURN_CODE := NO_MONITOR;
00000764  2          3:  (* Can't access monitor *)
00000764  2            RETURN_CODE := CANT_GET_MON;
0000076E  2          OTHERWISE (* Let emulation output msg *)
0000076E  2            RETURN_CODE := EMUL_PROBLEM
00000774  2        END; (* Of case statement *)
000007A2  2        IF RETURN_CODE <> NO_ERROR
000007AA  2          THEN (* Rampant emulator on the loose *)
000007AA  2            MY_EXIT ( RETURN_CODE );
000007B4  2
000007B4  2        (* Check for window function *)
000007B4  2
000007B4  2        IF ( USER_CMD = STOPP ) AND ( BREAK_FLAG = ON ) AND
000007B4  2           ( TOTAL_MSRMNT.CONFIG_PTR^.WINDOW = TRUE )
000007E8  2          THEN (* Done, but want window function *)
000007E8  2            BEGIN (* Set up window function *)
000007E8  2              USER_CMD := EXECUTE; (* Reset user command *)
000007F0  2              (* Mark closing of window *)
000007F0  2              WRITE_MSG_REC ( MSG_DATA, 18, MEM_UNLD_CNTR, RETURN_CODE );
0000080A  2              (* Re-initialize memory *)
0000080A  2              RELEASE ( DYN_PTR );
00000816  2              MARK ( DYN_PTR );
00000822  2              (* Re-translate measurement *)
00000822  2              TRANS_MEAS_IN ( TOTAL_MSRMNT, SYMBOL_TABLE, TRACE_HEAD,
00000822  2                              RETURN_CODE );
0000083E  2              IF RETURN_CODE <> NO_ERROR
00000846  2                THEN (* An error occurred *)
00000846  2                  MY_EXIT ( RETURN_CODE )
00000850  2            END; (* Set up window function *)
00000850  2
00000850  2        (* Get next spec *)
00000850  2
00000850  2        CURRENT_SPEC := GET_NEXT_SPEC;
00000858  2        FIRST_TIME := FALSE
0000085C  2      END; (* Load next specification, run, check the hardware for halted
00000860  2              and for completed, unload, repeat *)
00000860  2
00000860  2    (* Finish up trace file *)
00000860  2
```

```
00000860  2     FINISH_FOOTDC ( RETURN_CODE );
0000086A  2     IF RETURN_CODE = NO_ERROR
00000872  2       THEN (* We did it.  software debug triumphs again *)
00000872  2         CASE USER_CMD OF
0000087A  2           STOPP:  (* We disabled *)
0000087A  2             RETURN_CODE := STOPPED + 10;
00000884  2           EXECUTE, COMPLETE:  (* We completed *)
00000884  2             RETURN_CODE := COMPLETED + 10;
0000088E  2           OTHERWISE (* No defined end *)
0000088E  2             RETURN_CODE := HALTED + 10
00000894  2         END; (* Of case statement *)
000008BE  2
000008BE  2     (* Release memory, output final msg, and get out of here *)
000008BE  2     MY_EXIT ( RETURN_CODE )
000008C8  2   END; (* DYN_PRCSS *)
00000000  1   $GLOBPROC OFF$
00000000  1   .

508: Warning: field or entry alignment; record or array comparisons may not work

End of compilation, number of errors=    0

00000000  1   "68000" PREPROCESS
00000000  1   $EXTENSIONS ON$
00000000  1   $LIB_AD6_LONG$
00000000  1   $TITLE "Soda Static Controller Process"
00000000  1   PROGRAM STATIC_PROCESS;
00000000  1   (*
00000000  1   ******************************* STAT_PRCSS ******************************
00000000  1     This is it:  the main process of the conglomeration called the
00000000  1     Soda Static Controller.  This module contains the first level
00000000  1     routine, which trickles control down to all the peons who do the
00000000  1     grunt level stuff, like reading/writing to emulation memory to
00000000  1     accomplish the "measurement".  STAT_PRCSS is processor independent.
00000000  1     Author:  Kip Fulghum
00000000  1     Date:  1-5-84  Revised:  9-6-84
00000000  1   ***************************************************************************
00000000  1
00000000  1     The routine contained here essentially regulates the flow of
00000000  1     control between the portions of the Static Controller.  It provides
00000000  1     the necessary sequencing of starting the trace file, accomplishing
00000000  1     the measurement, and finishing the trace file given the constraints
00000000  1     of the Soda software package and its operating environment.  The
00000000  1     Static Controller leans on the Dynamic Controller pretty heavily.
00000000  1     It uses many of its routines, data structures, etc.  So don't be
00000000  1     suprised to see many references to the Dynamic Controller in the
00000000  1     Static Controller's documentation.
00000000  1
00000000  1     STAT_PRCSS contains the following routines:
00000000  1
00000000  1     -Procedure MY_EXIT makes a clean getaway from the Static Controller.
00000000  1     -Procedure MY_ENTRY makes a clean entry into the Static Controller.
00000000  1
00000000  1     STAT_PRCSS also uses the following external routines:  SET_PRI_,
00000000  1     SET_SIG_, READ_SIG_, READ_PID_, EXIT_, EMUL_STATUS,
00000000  1     DISPLAY_VAR, MODIFY_VAR,
00000000  1     BUILD_SYM_TAB, FIND_MEAS, START_FOOTDC, FINISH_FOOTDC, and EXIT_MSG.
00000000  1                                                                          *)
00000000  1   (*
00000000  1                             **************************
00000000  1                             ***** Include Files *****
00000000  1                             **************************
00000000  1                                                                          *)
00000000  1
00000000  1   #INCLUDE ER_CONST:SS_DYN
00000000  1
00000000  1   #INCLUDE COM_TYPES:SS_DYN
00000000  1
00000000  1   #INCLUDE PRCSS_TYPES:SS_DYN
00000000  1
00000000  1   #INCLUDE ICMD_DATA:SODAMON
00000000  1
00000000  1   #INCLUDE ICHILDREN:SODAMON
00000000  1
```

```
00000000  1  #INCLUDE TRANS_TYPES:SS_DYN
00000000  1
00000000  1  VAR
00000000  1
00000000  1  SEXTVAR CNS
00000000  1
00000000  1    CARE_PACKAGE:  PARAMETER_PTR; (* Care package pointer from parent *)
00000000  1
00000000  1    SYMBOL_TABLE:  SYM_DESCRIPS; (* Symbol table *)
00000000  1
00000000  1  SEXTVAR OFFS
00000000  1
00000000  1    STAT_PTR:  S_INT_PTR; (* Pointer for MARK/RELEASE *)
00000004  1
00000004  1    MEM_UNLD_CNTR:  S_INT; (* # of unloaded and valid states *)
00000006  1
00000006  1
00000006  1
00000006  1
00000006  1
00000006  1  $CALL_ABS_LONGS
00000000  1  (*
00000000  1                        *********************
00000000  1                        ***** SET_PRI_ *****
00000000  1                        *********************
00000000  1                                                                *)
00000000  1  PROCEDURE SET_PRI_ ( PRI:  S_INT ); EXTERNAL;
00000000  1  (*
00000000  1    Procedure SET_PRI_ to reset the current process' priority
00000000  1    to the given value.  Provided as part of the operating system.
00000000  1                                                                *)
00000000  1
00000000  1
00000000  1
00000000  1
00000000  1
00000000  1  (*
00000000  1                        *********************
00000000  1                        ***** SET_SIG_ *****
00000000  1                        *********************
00000000  1                                                                *)
00000000  1  PROCEDURE SET_SIG_ ( SIG:  L_INT ); EXTERNAL;
00000000  1  (*
00000000  1    Procedure SET_SIG to set a signal indicator in the current process.
00000000  1    Provided as part of the operating system.
00000000  1                                                                *)
00000000  1
00000000  1
00000000  1
00000000  1
00000000  1
00000000  1  (*
00000000  1                        **********************
00000000  1                        ***** READ_SIG_ *****
00000000  1                        **********************
00000000  1                                                                *)
00000000  1  PROCEDURE READ_SIG_ ( ID:  S_INT; VAR SIG:  L_INT ); EXTERNAL;
00000000  1  (*
00000000  1    Procedure READ_SIG_ to read the signal indicator of the given
00000000  1    process.  Provided as part of the operating system.
00000000  1                                                                *)
00000000  1
00000000  1
00000000  1
00000000  1
00000000  1
00000000  1  (*
00000000  1                        **********************
00000000  1                        ***** READ_PID_ *****
00000000  1                        **********************
00000000  1                                                                *)
00000000  1  PROCEDURE READ_PID_ ( VAR PID:  S_INT ); EXTERNAL;
00000000  1  (*
00000000  1    Procedure READ_PID_ to return the current process' parent I.D
```

```
00000000 1    Provided as part of the operating system.
00000000 1                                                                   *)
00000000 1
00000000 1
00000000 1
00000000 1
00000000 1
00000000 1  (*
00000000 1                             *****************
00000000 1                             ***** EXIT_ *****
00000000 1                             *****************
00000000 1                                                                   *)
00000000 1  PROCEDURE EXIT_; EXTERNAL;
00000000 1  (*
00000000 1    Procedure EXIT_ to remove a process from further execution:
00000000 1    its status is set in limbo.  Provided as part of the operating system.
00000000 1                                                                   *)
00000000 1
00000000 1
00000000 1
00000000 1
00000000 1
00000000 1  (*
00000000 1                        ***********************
00000000 1                        ***** EMUL_STATUS *****
00000000 1                        ***********************
00000000 1                                                                   *)
00000000 1  PROCEDURE EMUL_STATUS ( NUM_TRIES:  S_INT; VAR STATUS_CODE:  S_INT );
00000000 2                        EXTERNAL;
00000000 1  (*
00000000 1    Procedure EMUL_STATUS to see if the emulation monitor is out there
00000000 1    in emulation land.  Provided as part of the message handler.
00000000 1                                                                   *)
00000000 1
00000000 1
00000000 1
00000000 1
00000000 1
00000000 1  (*
00000000 1                        ***********************
00000000 1                        ***** DISPLAY_VAR *****
00000000 1                        ***********************
00000000 1                                                                   *)
00000000 1  PROCEDURE DISPLAY_VAR ( VAR MEAS_:  CMD_DATA_ARRAY; VAR SYMS_:
00000000 2                        SYM_DESCRIPS; VAR UNLD_COUNT, R_CODE:  S_INT );
00000000 2                        EXTERNAL;
00000000 1  (*
00000000 1    Procedure DISPLAY_VARIABLE to unload the given variable and write
00000000 1    out its value to the trace file.  Provided as a Pascal external
00000000 1                                                                   *)
00000000 1
00000000 1
00000000 1
00000000 1
00000000 1
00000000 1  (*
00000000 1                        **********************
00000000 1                        ***** MODIFY_VAR *****
00000000 1                        **********************
00000000 1                                                                   *)
00000000 1  PROCEDURE MODIFY_VAR ( VAR MEAS_:  CMD_DATA_ARRAY; VAR SYMS_:
00000000 2                       SYM_DESCRIPS; VAR UNLD_COUNT, R_CODE:  S_INT );
00000000 2                       EXTERNAL;
00000006 1  (*
00000006 1    Procedure MODIFY_VARIABLE to write the given value to the given
00000006 1    variable in emulation memory.  Provided as a Pascal external.
00000006 1                                                                   *)
00000006 1
00000006 1
00000006 1
00000006 1
00000006 1
00000006 1  $CALL_PC_SHORTS
00000000 1  (*
```

```
00000000 1                          ***************************
00000000 1                          ***** BUILD_SYM_TAB *****
00000000 1                          ***************************
00000000 1                                                                  *)
00000000 1  PROCEDURE BUILD_SYM_TAB ( VAR MEAS_STRUCT:  CMD_DATA_ARRAY; VAR
00000000 2                          SYM_STRUCT:  SYM_DESCRIPS ); EXTERNAL;
00000000 1  (*
00000000 1    Procedure BUILD_SYM_TAB to build a symbol table from all the
00000000 1    unique symbols in the measurement structure.  Provided as a Pascal
00000000 1    external.
00000000 1                                                                  *)
00000000 1
00000000 1
00000000 1
00000000 1
00000000 1
00000000 1  (*
00000000 1                          ***********************
00000000 1                          ***** FIND_MEAS *****
00000000 1                          ***********************
00000000 1                                                                  *)
00000000 1  FUNCTION FIND_MEAS ( VAR MEAS_STRUCT:  CMD_DATA_ARRAY ):  S_INT;
00000002 2                      EXTERNAL;
00000000 1  (*
00000000 1    Function FIND_MEAS to return the index of the record in the user
00000000 1    measurement structure describing the type of measurement.  Provided
00000000 1    as a Pascal external.
00000000 1                                                                  *)
00000000 1
00000000 1
00000000 1
00000000 1
00000000 1
00000000 1  (*
00000000 1                          ***************************
00000000 1                          ***** START_FOOTDC *****
00000000 1                          ***************************
00000000 1                                                                  *)
00000000 1  PROCEDURE START_FOOTDC ( VAR TOTAL_MEAS:  TOTAL_MEAS_REC; VAR SYMBOLS:
00000000 2                          SYM_DESCRIPS; VAR RET_CODE:  S_INT ); EXTERNAL;
00000000 1  (*
00000000 1    Procedure START_FOOTDC to initiate creation of the trace file
00000000 1    and write out the header record, the command and configuration
00000000 1    records, and the symbol records.  Provided as a Pascal external.
00000000 1                                                                  *)
00000000 1
00000000 1
00000000 1
00000000 1
00000000 1
00000000 1  (*
00000000 1                          ****************************
00000000 1                          ***** FINISH_FOOTDC *****
00000000 1                          ****************************
00000000 1                                                                  *)
00000000 1  PROCEDURE FINISH_FOOTDC ( VAR FMGR_CODE:  S_INT ); EXTERNAL;
00000000 1  (*
00000000 1    Procedure FINISH_FOOTDC to write out the end of data record and close
00000000 1    the trace file.  Provided as a Pascal external.
00000000 1                                                                  *)
00000000 1
00000000 1
00000000 1
00000000 1
00000000 1
00000000 1  (*
00000000 1                          **********************
00000000 1                          ***** EXIT_MSG *****
00000000 1                          **********************
00000000 1                                                                  *)
00000000 1  PROCEDURE EXIT_MSG ( CODE, RECS:  S_INT ); EXTERNAL;
00000000 1  (*
```

```
00000000  1    Procedure EXIT_MSG to put up the appropriate final status/error
00000000  1    message.  Provided as a Pascal external.
00000000  1                                                                    *)
00000000  1
00000000  1
00000000  1
00000000  1
00000000  1
00000000  1  (*
00000000  1                         ******************
00000000  1                         ***** MY_EXIT *****
00000000  1                         ******************
00000000  1                                                                    *)
00000000  1  PROCEDURE MY_EXIT ( EXIT_CODE:  S_INT );
00000000  2  (*
00000000  2    Procedure MY_EXIT to clean up and exit the Static Controller
00000000  2    process.  Procedure issues a message based on the code passed
00000000  2    to it, RELEASEs all memory MARKed with STAT_PTR, sets the process
00000000  2    signal appropriately, then exits into nothingness.
00000000  2
00000000  2    MY_EXIT uses the following routines:  SET_PRI_, SET_SIG_, EXIT_,
00000000  2    FINISH_FOOTDC, and EXIT_MSG.
00000000  2
00000000  2    Input:  1) EXIT_CODE, the code specifying what error message, if any, is
00000000  2               to be output:
00000000  2               = -100 indicates error but no message
00000000  2               = -99 to -1 indicates Static Controller error message
00000000  2               = 0 indicates no error and no message
00000000  2               = 1 to 9 indicates file manager error message
00000000  2    Output:  none ( procedure doesn't return )
00000000  2                                                                    *)
00000000  2  VAR
00000000  2
00000000  2    FINISH_CODE:  S_INT; (* Return code from FINISH_FOOTDC *)
00000002  2
00000002  2    FINAL_STATUS:  S_INT; (* Final Controller status *)
00000004  2
00000004  2  BEGIN (* Procedure MY_EXIT *)
00000004  2    (* Output an appropriate farewell message *)
00000004  2    EXIT_MSG ( EXIT_CODE, MEM_UNLD_CNTR );
00000012  2    (* Raise priority to make sure the exit goes through after the flag
00000012  2       is set *)
00000012  2    SET_PRI_ ( PRCSS_HI_PRI );
0000001E  2
0000001E  2    IF EXIT_CODE = NO_ERROR
00000026  2      THEN (* Display/modify completed *)
00000026  2        FINAL_STATUS := COMPLETED
00000030  2      ELSE (* Something very, very BAD happened *)
00000030  2        BEGIN (* Tell papa things fell apart *)
00000030  2          (* Make sure trace file is closed *)
00000030  2          FINISH_FOOTDC ( FINISH_CODE );
0000003A  2          IF FINISH_CODE = 3
00000046  2            THEN (* File did not exist *)
00000046  2              FINAL_STATUS := CATASTROPHE (* No new data *)
00000050  2            ELSE (* File did exist *)
00000050  2              FINAL_STATUS := SEMI_CATAST (* There is new data *)
00000056  2        END; (* Tell papa things fell apart *)
00000056  2
00000056  2    RELEASE ( STAT_PTR );
00000062  2
00000062  2    (* Tell the 68000 and NOT the BPC what happened *)
00000062  2    IF ( MEM_UNLD_CNTR = 0 ) AND ( FINAL_STATUS <> CATASTROPHE )
00000080  2      THEN (* Don't want to display any data *)
00000080  2        SET_SIG_ ( NO_DATA )
00000092  2      ELSE (* Return actual status *)
00000092  2        SET_SIG_ ( FINAL_STATUS );
000000A2  2    EXIT_
000000A8  2  END; (* Procedure MY_EXIT *)
00000000  1
00000000  1
00000000  1
00000000  1
00000000  1
00000000  1  (*
```

```
00000000  1                       *********************
00000000  1                       ***** MY_ENTRY *****
00000000  1                       *********************
00000000  1                                                                   *)
00000000  1  PROCEDURE MY_ENTRY ( VAR TOTAL_MEAS:  TOTAL_MEAS_REC; VAR CARE_PTR:
00000000  2                       PARAMETER_PTR );
00000000  2  (*
00000000  2    Procedure MY_ENTRY to enter the Static Controller process.
00000000  2    Procedure sets the process signal appropriately, MARKs all
00000000  2    memory with STAT_PTR, then obtains all input parameters necessary
00000000  2    for the trace.
00000000  2
00000000  2    Note:  MY_ENTRY is a first level routine, so it can and will call
00000000  2           MY_EXIT if an error occurs.  This means under certain
00000000  2           conditions it never returns!
00000000  2
00000000  2    MY_ENTRY uses the following routines:  SET_PRI_, SET_SIG_, READ_SIG_,
00000000  2    and READ_PID_.
00000000  2
00000000  2    Input:  none
00000000  2    Output:  1) TOTAL_MEAS, a record describing the entire measurement
00000000  2                to be taken
00000000  2             2) CARE_PTR, a pointer to the structure for communication
00000000  2                with the user
00000000  2                                                                   *)
00000000  2  VAR
00000000  2
00000000  2    PID:  S_INT; (* I.D. of parent process *)
00000002  2
00000002  2    PSIG:  L_INT; (* Signal of parent process *)
000000B0  2
000000B0  2  BEGIN (* Procedure MY_ENTRY *)
000000B0  2
000000B0  2    (* Initialize *)
000000B0  2
000000B0  2    (* DON'T tell DPC I'm here *)
000000B0  2    SET_SIG_ ( RUNNING_MRI ); (* Tell 68000 I'm here *)
000000BE  2    SET_PRI_ ( PRCSS_LO_PRI ); (* Set my priority to non-critical *)
000000C8  2    MARK ( STAT_PTR ); (* Remember where I started NEWing everything *)
000000D4  2
000000D4  2    (* Find out who my parent is and get input parameters *)
000000D4  2
000000D4  2    READ_PID_ ( PID );
000000E0  2    READ_SIG_ ( PID, PSIG );
000000F0  2    (* Do under-the-table type changes *)
000000F0  2    CARE_PTR := PARAMETER_PTR ( PSIG );
000000F8  2    WITH TOTAL_MEAS DO
00000100  2      BEGIN (* Transfer input stuff to my record *)
00000100  2        START_PTR := NIL;
00000102  2        STOP_PTR := NIL;
0000010A  2        MEAS_PTR := CMD_ARRAY_PTR ( CARE_PTR^.CMD_STACK_PTR );
0000011A  2        CMD_PTR := CMD_REC_PTR ( CARE_PTR^.COMMAND_PTR );
0000012A  2        CONFIG_PTR := CONFIG_REC_PTR ( CARE_PTR^.CONFIG_PTR )
0000013A  2      END (* Transfer input stuff to my record *)
0000013A  2  END; (* Procedure MY_ENTRY *)
00000000  1
00000000  1
00000000  1
00000000  1
00000000  1
00000000  1  (*
00000000  1                       ***********************
00000000  1                       ***** STAT_PRCSS *****
00000000  1                       ***********************
00000000  1                                                                   *)
00000000  1  $GLOBPROC ON$
00000000  1  PROCEDURE STAT_PRCSS;
00000000  2  (*
00000000  2   Here it is.  The routine does all that was promised at the beginning.
00000000  2   It also initiates the outputting of status messages when appropriate.
00000000  2   If there is a fatal load/unload error along the way, the process will
00000000  2   initiate the issuing of an error message and terminate itself.
00000000  2
```

```
00000000  2   STAT_PRCSS uses the following routines:  MY_EXIT, MY_ENTRY,
00000000  2   EMUL_STATUS, DISPLAY_VAR, MODIFY_VAR, BUILD_SYM_TAB, FIND_MEAS,
00000000  2   START_FOOTDC, and FINISH_FOOTDC.
00000000  2
00000000  2   Input:  none
00000000  2
00000000  2           The parent signal is read to obtain input parameters and to
00000000  2           report status.  Basically, there are five pointers that
00000000  2           are of concern:  one to a command description, one to a
00000000  2           configuration description, one to a measurement description,
00000000  2           one to an enable description, and finally, one to a disable
00000000  2           description.  These last two are not used by the Static
00000000  2           Controller.  A -1 in the action field indicates an abort.
00000000  2
00000000  2   Output:  none
00000000  2
00000000  2            Status is not reported to the BPC.  Status is reported to
00000000  2            to the 68000 via the process signal, with the following
00000000  2            meanings:
00000000  2             -3 indicates no data was captured
00000000  2             -2 indicates a semi-fatal error has occurred
00000000  2             -1 indicates a fatal error has occurred
00000000  2              3 indicates I'm doing it
00000000  2              5 indicates I'm done
00000000  2                                                                      *)
00000000  2 VAR
00000000  2
00000000  2   RETURN_CODE:  S_INT; (* Return code from other routines *)
00000002  2
00000002  2   TOTAL_MSRMNT:  TOTAL_MEAS_REC; (* Input structure describing all
00000016  2                                     aspects of the measurement to be
00000016  2                                     made, ie start/sequence/stop,
00000016  2                                     actual measurnent, command, and
00000016  2                                     configuration *)
00000016  2
00000016  2   EMUL_CODE:  S_INT; (* Return code from the emulator subsystem *)
00000018  2
00000018  2   MSRMNT_INDEX:  S_INT; (* Index into measurement description structure
00000142  2                            of measurement type record *)
00000142  2
00000142  2 BEGIN (* STAT_PRCSS *)
00000142  2   RETURN_CODE := NO_ERROR; (* Set it just to be on the safe side *)
00000146  2
00000146  2   (* Initialize and get input parameters *)
00000146  2
00000146  2   MY_ENTRY ( TOTAL_MSRMNT, CARE_PACKAGE );
00000154  2
00000154  2   (* Make sure the emulator is here *)
00000154  2
00000154  2   EMUL_STATUS ( 128, EMUL_CODE );
00000164  2   IF EMUL_CODE > 0
0000016C  2     THEN (* Not in monitor for some reason *)
0000016C  2       BEGIN (* Exit with correct error code *)
0000016C  2         CASE EMUL_CODE OF
00000176  2           1,5:  (* Not in monitor or reset *)
00000176  2             RETURN_CODE := NOT_IN_MONITOR;
00000180  2           2:  (* No monitor *)
00000180  2             RETURN_CODE := NO_MONITOR;
0000018A  2           3:  (* Can't access monitor *)
0000018A  2             RETURN_CODE := CANT_GET_MON;
00000194  2           OTHERWISE (* Let emulation output msg *)
00000194  2             RETURN_CODE := EMUL_PROBLEM
0000019A  2         END; (* Of case statement *)
000001C4  2         MY_EXIT ( RETURN_CODE )
000001CE  2       END; (* Exit with correct error code *)
000001CE  2
000001CE  2   (* Build a table containing all unique symbols and find out what
000001CE  2      measurement we are doing *)
000001CE  2
000001CE  2   BUILD_SYM_TAB ( TOTAL_MSRMNT.MEAS_PTR^, SYMBOL_TABLE );
000001DE  2   MSRMNT_INDEX := FIND_MEAS ( TOTAL_MSRMNT.MEAS_PTR^ );
000001EE  2   IF ( SYMBOL_TABLE.SYMBOL_COUNT > MAX_SYMS ) OR ( MSRMNT_INDEX < 0 )
0000020C  2     THEN (* Too many symbols or measurement found *)
0000020C  2       MY_EXIT ( CORRUPT_USER ); (* Make a fast getaway *)
```

```
494 00000216  2
495 00000216  2    (* Start the trace file *)
496 00000216  2
497 00000216  2    START_FOOTDC ( TOTAL_MSRMNT, SYMBOL_TABLE, RETURN_CODE );
498 0000022C  2    IF RETURN_CODE <> NO_ERROR
499 00000234  2      THEN (* Get out while the getting is good *)
500 00000234  2        MY_EXIT ( RETURN_CODE );
501 0000023E  2
502 0000023E  2    (* Now, do the display/modify *)
503 0000023E  2
504 0000023E  2    MEM_UNLD_CNTR := 0;
505 00000242  2    CASE TOTAL_MSRMNT.MEAS_PTR^ [ MSRMNT_INDEX ].OP_CODE OF
506 00000258  2      DISP_VAR:  (* Display variable *)
507 00000258  2        (* Display a variable for this simple-minded moron *)
508 00000258  2        DISPLAY_VAR ( TOTAL_MSRMNT.MEAS_PTR^, SYMBOL_TABLE, MEM_UNLD_CNTR,
509 00000258  2                      RETURN_CODE );
510 0000027A  2      MOD_VAR:  (* Modify variable *)
511 0000027A  2        (* Modify this simple-minded moron's variable *)
512 0000027A  2        MODIFY_VAR ( TOTAL_MSRMNT.MEAS_PTR^, SYMBOL_TABLE, MEM_UNLD_CNTR,
513 0000027A  2                     RETURN_CODE );
514 0000029C  2      OTHERWISE (* Unimplemented measurement *)
515 0000029C  2        RETURN_CODE := UNIMP_MEAS
516 000002A2  2    END; (* Of case statement *)
517 000002C6  2
518 000002C6  2    IF RETURN_CODE <> NO_ERROR
519 000002CE  2      THEN (* We ran into a problem somewhere *)
520 000002CE  2        MY_EXIT ( RETURN_CODE );
521 000002D8  2
522 000002D8  2    (* Finish  up trace file *)
523 000002D8  2
524 000002D8  2    FINISH_FOOTDC ( RETURN_CODE );
525 000002E2  2
526 000002E2  2    (* Release memory, output final msg, and get out of here *)
527 000002E2  2    MY_EXIT ( RETURN_CODE )
528 000002EC  2  END; (* STAT_PRCSS *)
529 00000000  1  $GLOBPROC OFF$
530 00000000  1
508: Warning: field or entry alignment, record or array comparisons may not work

End of compilation, number of errors=    0
  1 00000000  1  "68000" PREPROCESS
  2 00000000  1  $EXTENSIONS ON$
  3 00000000  1  $TITLE "Soda Hardware Loader"
  4 00000000  1  PROGRAM LOADER;
  5 00000000  1  (*
  6 00000000  1  ********************************** LOADER **********************************
  7 00000000  1    LOADER is the module which contains all hardware loading routines,
  8 00000000  1    except for the fast sequencer and the micro-code occurence counters,
  9 00000000  1    for the Soda hardware set.  This includes the low level loaders for
 10 00000000  1    the low level resources, the high level resources, the function
 11 00000000  1    generators, and the control words.  Any loading of the above portions
 12 00000000  1    of the Soda hardware set should be done via some routine right here.
 13 00000000  1    LOADER is processor independent.
 14 00000000  1    Author:  Kip Fulghum
 15 00000000  1    Date:  8-2-82  Revised:  1-16-84
 16 00000000  1  ****************************************************************************
 17 00000000  1
 18 00000000  1    LOADER is responsible for controlling all loading aspects of the
 19 00000000  1    Soda hardware set.  It contains all the basic routines necessary for
 20 00000000  1    loading all portions of the hardware ( except the fast sequencer,
 21 00000000  1    the micro-code occurence hardware, and the main occurance counters )
 22 00000000  1    with the given hardware specification created via a translator, which
 23 00000000  1    should be invoked prior to the call to the loader.
 24 00000000  1
 25 00000000  1    WARNING:  LOADER assumes that the hardware is already in load/unload
 26 00000000  1              mode!
 27 00000000  1
 28 00000000  1    LOADER contains the following routines:
 29 00000000  1    -Procedure PUSH pushes the given entry onto the given stack.
 30 00000000  1    -Procedure POP pops the next entry off the given stack.
 31 00000000  1    -Global procedure VALUE_MASK_CHEF cooks up the appropriate value/
 32 00000000  1     mask combination for the given signal considering its condition and
 33 00000000  1     logic polarity.
```

```
00000000 1    -Function CREATE_PRG_WORD creates the correct programmed output
00000000 1     word for the given condition of the current state.
00000000 1    -Global function EVAL_FUNCTION evalutates the given function with
00000000 1     the given inputs.
00000000 1    -Procedure LOAD_LL_RSRCS loads the low level resources with the
00000000 1     given specifications.
00000000 1    -Procedure LOAD_HL_RSRCS loads the high level resources with the
00000000 1     given specifications.
00000000 1    -Procedure LOAD_FUNC_GENS loads the function generators with the
00000000 1     given specifications.
00000000 1    -Procedure LOAD_CNTRL_WORDS loads the control words/bytes of the
00000000 1     Soda hardware set with the indicated features.
00000000 1    -Global procedure LOAD_HW loads the Soda hardware with the given
00000000 1     hardware specification.
00000000 1
00000000 1    In addition, LOADER uses the following external procedures:
00000000 1    CLEAR_FP_COUNTER, INIT_REGISTERS, INIT_MAC, INIT_FSR, SET_BITS,
00000000 1    CLEAR_BITS, TEST_BITS, WRITE_CNTRL_WRD, LOAD_FSR, LOAD_COUNTERS,
00000000 1    and LOAD_OCCURRANCE.
00000000 1                                                                   *)
00000000 1  (*
00000000 1                       **************************
00000000 1                       ***** Include Files *****
00000000 1                       **************************
00000000 1                                                                   *)
00000000 1
00000000 1  #INCLUDE COM_TYPES:SS_DYN
00000000 1
00000000 1  #INCLUDE LD_TYPES:SS_DYN
00000000 1
00000000 1  CONST
00000000 1
00000000 1  (*
00000000 1                       *****************************
00000000 1                       ***** Stack Constants *****
00000000 1                       *****************************
00000000 1                                                                   *)
00000000 1
00000000 1    MAX_TOP = ( MAX_FUNC_INDEX + 1 ) DIV 2; (* Maximum stack index *)
00000000 1
00000000 1  TYPE
00000000 1
00000000 1  (*
00000000 1                       ************************
00000000 1                       ***** Stack Types *****
00000000 1                       ************************
00000000 1                                                                   *)
00000000 1
00000000 1    STACK_ENTRY = BOOLEAN;
00000000 1
00000000 1    STACK_INDEX = -1..MAX_TOP;
00000000 1
00000000 1    STACK_TYPE = ARRAY [ 0..MAX_TOP ] OF STACK_ENTRY;
****WARNING ??                                       ^508
00000000 1
00000000 1    STACK_RETCODE = -1..1;
00000000 1
00000000 1
00000000 1
00000000 1
00000000 1
00000000 1  (*
00000000 1                       **************************
00000000 1                       ***** CLEAR_FP_CNTR *****
00000000 1                       **************************
00000000 1                                                                   *)
00000000 1  PROCEDURE CLEAR_FP_CNTR ( CUR_CNTRL_2, CUR_MEM_BYTE:  L_INT; VAR
00000000 2                           GREY_COUNT:  L_INT ); EXTERNAL;
00000000 1  (*
00000000 1    Procedure CLEAR_FP_CNTR to clear the floating point counter on the
00000000 1    CPU board.  Provided as an assembly language external.
00000000 1                                                                   *)
00000000 1
00000000 1
```

```
00000000  1
00000000  1
00000000  1
00000000  1  (*
00000000  1                              ****************************
00000000  1                              ***** INIT_REGISTERS *****
00000000  1                              ****************************
00000000  1                                                                    *)
00000000  1  PROCEDURE INIT_REGISTERS ( CUR_CNTRL_Z, CUR_MEM_BYTE:  L_INT );
00000000  2                             EXTERNAL;
00000000  1  (*
00000000  1    Procedure INIT_REGISTERS to initialize the X and Y function generator
00000000  1    state registers.  Provided as an assembly language external.
00000000  1                                                                    *)
00000000  1
00000000  1
00000000  1
00000000  1
00000000  1
00000000  1  (*
00000000  1                              *********************
00000000  1                              ***** INIT_MAC *****
00000000  1                              *********************
00000000  1                                                                    *)
00000000  1  PROCEDURE INIT_MAC ( START_MAC:  S_INT; VAR CUR_MEM_BYTE:  L_INT );
00000000  2                       EXTERNAL;
00000000  1  (*
00000000  1    Procedure INIT_MAC to initialize the memory address counter on the
00000000  1    memory board.  Provided as an assembly language external.
00000000  1                                                                    *)
00000000  1
00000000  1
00000000  1
00000000  1
00000000  1
00000000  1  (*
00000000  1                              *********************
00000000  1                              ***** INIT_FSR *****
00000000  1                              *********************
00000000  1                                                                    *)
00000000  1  PROCEDURE INIT_FSR ( VAR FAST_SQR:  FSR_REC_TYPE; VAR CON_ARRAY:
00000000  2                       CNTRL_ARRAY_TYPE ); EXTERNAL;
00000000  1  (*
00000000  1    Procedure INIT_FSR to load the Soda fast sequencer resources and
00000000  1    adder values with the initial values in the given specification.
00000000  1    Provided as a Pascal external.
00000000  1                                                                    *)
00000000  1
00000000  1
00000000  1
00000000  1
00000000  1
00000000  1  (*
00000000  1                              *********************
00000000  1                              ***** SET_BITS *****
00000000  1                              *********************
00000000  1                                                                    *)
00000000  1  PROCEDURE SET_BITS ( BIT_WORD:  L_INT; VAR SET_WORD:  L_INT ); EXTERNAL;
00000000  1  (*
00000000  1    Procedure SET_BITS to set the bits indicated in BIT_WORD in SET_WORD,
00000000  1    ie "OR" BIT_WORD with SET_WORD.  Provided as an assembly language
00000000  1    external.
00000000  1                                                                    *)
00000000  1
00000000  1
00000000  1
00000000  1
00000000  1
00000000  1  (*
00000000  1                              ***********************
00000000  1                              ***** CLEAR_BITS *****
00000000  1                              ***********************
00000000  1                                                                    *)
```

```
00000000 1  PROCEDURE CLEAR_BITS ( BIT_WORD: L_INT; VAR CLEAR_WORD: L_INT );
00000000 2                             EXTERNAL;
00000000 1  (*
00000000 1    Procedure CLEAR_BITS to clear the bits indicated in BIT_WORD in
00000000 1    CLEAR_WORD, ie "NOT" BIT_WORD, then "AND" with CLEAR_WORD.  Provided
00000000 1    as an assembly language external.
00000000 1                                                                       *)
00000000 1
00000000 1
00000000 1
00000000 1
00000000 1
00000000 1  (*
00000000 1                             **********************
00000000 1                             ***** TEST_BITS *****
00000000 1                             **********************
00000000 1                                                                       *)
00000000 1  FUNCTION TEST_BITS ( BIT_WORD, TEST_WORD:  L_INT ):  BOOLEAN; EXTERNAL;
00000000 1  (*
00000000 1    Function TEST_BITS to see if all of the bits indicated in BIT_WORD
00000000 1    are set in TEST_WORD, ie "AND" both words and see if the result is
00000000 1    equal to BIT_WORD.  Provided as an assembly language external.
00000000 1                                                                       *)
00000000 1
00000000 1
00000000 1
00000000 1
00000000 1
00000000 1  (*
00000000 1                           ****************************
00000000 1                           ***** WRITE_CNTRL_WRD *****
00000000 1                           ****************************
00000000 1                                                                       *)
00000000 1  PROCEDURE WRITE_CNTRL_WRD ( TYPE_WORD:  CNTRLLR_TYPES; CONTROL_VALUE:
00000000 2                              L_INT ); EXTERNAL;
00000000 1  (*
00000000 1    Procedure WRITE_CNTRL_WRD to write the indicated control word out to
00000000 1    its designated location in memory.  Provided as a Pascal external.
00000000 1                                                                       *)
00000000 1
00000000 1
00000000 1
00000000 1
00000000 1
00000000 1  (*
00000000 1                             *********************
00000000 1                             ***** LOAD_FSR *****
00000000 1                             *********************
00000000 1                                                                       *)
00000000 1  PROCEDURE LOAD_FSR ( VAR FAST_SQR:  FSR_REC_TYPE; VAR CON_ARRAY:
00000000 2                       CNTRL_ARRAY_TYPE );  EXTERNAL;
00000000 1  (*
00000000 1    Procedure LOAD_FSR to load the fast sequencer resources with the
00000000 1    given specification.  Provided as a Pascal external.
00000000 1                                                                       *)
00000000 1
00000000 1
00000000 1
00000000 1
00000000 1
00000000 1  (*
00000000 1                            **************************
00000000 1                            ***** LOAD_COUNTERS *****
00000000 1                            **************************
00000000 1                                                                       *)
00000000 1  PROCEDURE LOAD_COUNTERS ( MICRO_COUNTS:  CNT_REC_PTR; VAR
00000000 2                            CON_ARRAY:  CNTRL_ARRAY_TYPE ); EXTERNAL;
00000000 1  (*
00000000 1    Procedure LOAD_COUNTERS to load the micro-code occurence counters
00000000 1    with the given specification.  Provided as a Pascal external.
00000000 1                                                                       *)
00000000 1
00000000 1
00000000 1
```

```
00000000  1
00000000  1
00000000  1  (*
00000000  1                          ****************************
00000000  1                          ***** LOAD_OCCURANCE *****
00000000  1                          ****************************.
00000000  1                                                                      *)
00000000  1  PROCEDURE LOAD_OCCURANCE ( COUNT:  S_INT; TIME:  L_INT ); EXTERNAL;
00000000  1  (*
00000000  1    Procedure LOAD_OCCURANCE to load the main Soda occurance counters
00000000  1    with the given values.  Provided as a Pascal external.
00000000  1                                                                      *)
00000000  1
00000000  1
00000000  1
00000000  1
00000000  1
00000000  1  (*
00000000  1                               ****************
00000000  1                               ***** PUSH *****
00000000  1                               ****************
00000000  1                                                                      *)
00000000  1  PROCEDURE PUSH ( ENTRY:  STACK_ENTRY; VAR STACK:  STACK_TYPE; VAR
00000000  2                   TOP:  STACK_INDEX; VAR CODE:  STACK_RETCODE );
00000004  2  (*
00000004  2    Procedure PUSH to push the given entry onto the given stack.  PUSH
00000004  2    checks for stack overflow, then increments the index to the top of
00000004  2    the stack and pushes the entry on.
00000004  2
00000004  2    Input:  1) ENTRY, the entry to be pushed onto the stack
00000004  2            2) STACK, the stack onto which ENTRY is to be pushed
00000004  2            3) TOP, the current top of the stack
00000004  2    Output:  1) STACK, the stack with new entry on top
00000004  2             2) TOP, the new index to the top of the stack
00000004  2             3) CODE, a code specifying how the operation turned out:
00000004  2                  1 indicates no error:  operation completed  .
00000004  2                 -1 indicates stack overflow
00000004  2                                                                      *)
00000004  2  BEGIN (* Procedure PUSH *)
00000004  2    IF TOP >= MAX_TOP
00000012  2      THEN (* The impossible has happened:  stack overflow *)
00000012  2        CODE := -1 (* Set code to indicate error *)
0000001E  2      ELSE (* Stack is alright:  not full *)
0000001E  2        BEGIN (* Increment top, then push entry onto stack *)
0000001E  2          TOP := TOP + 1;
00000028  2          STACK [ TOP ] := ENTRY;
0000003A  2          CODE := 1 (* Set code to indicate O.K. *)
00000042  2        END (* Increment top, then push entry onto stack *)
00000042  2  END; (* Procedure PUSH *)
00000000  1
00000000  1
00000000  1
00000000  1
00000000  1
00000000  1  (*
00000000  1                               ***************
00000000  1                               ***** POP *****
00000000  1                               ***************
00000000  1                                                                      *)
00000000  1  PROCEDURE POP ( VAR STACK:  STACK_TYPE; VAR TOP:  STACK_INDEX; VAR
00000000  2                  ENTRY:  STACK_ENTRY; VAR CODE:  STACK_RETCODE );
0000004A  2  (*
0000004A  2    Procedure POP to pop the next entry off the given stack.  POP checks
0000004A  2    for stack underflow, then pops the next entry off the stack and
0000004A  2    decrements the index to the top of the stack.
0000004A  2
0000004A  2    Input:  1) STACK, the stack from which ENTRY is to be popped
0000004A  2            2) TOP, the current top of the stack
0000004A  2    Output:  1) STACK, the stack with the entry popped off
0000004A  2             2) TOP, the new index to the top of the stack
0000004A  2             3) ENTRY, the entry which was popped from the stack
0000004A  2             4) CODE, a code specifying how the operation turned out:
0000004A  2                  1 indicates no error:  operation completed
0000004A  2                 -1 indicates stack underflow
0000004A  2                                                                      *)
```

```
0000004A  2  BEGIN (* Procedure POP *)
0000004A  2    IF TOP < 0
00000054  2      THEN (* The impossible has happened:  stack underflow *)
00000054  2        CODE := -1 (* Set code to indicate error *)
00000060  2      ELSE (* Stack is alright:  not empty *)
00000060  2        BEGIN (* Pop entry from stack, then decrement top *)
00000060  2          ENTRY := STACK [ TOP ];
00000074  2          TOP := TOP - 1;
0000007E  2          CODE := 1 (* Set code to indicate O.K. *)
00000086  2        END (* Pop entry from stack, then decrement top *)
00000096  2  END; (* Procedure POP *)
00000000  1
00000000  1
00000000  1
00000000  1
00000000  1
00000000  1  (*
00000000  1                       ****************************
00000000  1                       ***** VALUE_MASK_CHEF *****
00000000  1                       ****************************
00000000  1                                                                   *)
00000000  1  $GLOBPROC ON$
00000000  1  PROCEDURE VALUE_MASK_CHEF ( VAR BIT_REC:  CONDITION_REC; VAR VALUE_WORD,
00000000  2                              MASK_WORD:  L_INT );
0000008E  2  (*
0000008E  2    Procedure VALUE_MASK_CHEF to cook up the correct value/mask
0000008E  2    combination for the given signal considering whether you want the
0000008E  2    signal on, off, or don't care, and considering the logic polarity
0000008E  2    of the signal, ie high true or low true.  If the signal is on or
0000008E  2    off, the appropriate bits are set in the mask word indicating a care.
0000008E  2    Then, depending on whether the signal is on or off and its logic
0000008E  2    polarity, the appropriate bits in the value word are set/cleared.
0000008E  2    If the signal is a don't care, the appropriate bits in the mask word
0000008E  2    are cleared, with those bits in the value word being set.
0000008E  2
0000008E  2    VALUE_MASK_CHEF uses the following routines:  SET_BITS and CLEAR_BITS.
0000008E  2
0000008E  2    Input:  1) BIT_REC, the record describing the status of the signal
0000008E  2            2) VALUE_WORD, the word to have the signal set up in
0000008E  2            3) MASK_WORD, the word to have the signal's mask set up in
0000008E  2    Output:  1) VALUE_WORD, the updated value word
0000008E  2             2) MASK_WORD, the updated mask word
0000008E  2                                                                   *)
0000008E  2  BEGIN (* Procedure VALUE_MASK_CHEF *)
0000008E  2    CASE BIT_REC.CONDITION OF
0000009A  2      ON:  (* This signal is supposed to be on *)
0000009A  2        BEGIN (* Turn signal on *)
0000009A  2          SET_BITS ( BIT_REC.MASK, MASK_WORD ); (* Set bits in care/don't
000000AE  2                                                    care mask *)
000000AE  2          IF BIT_REC.TRUE_POLARITY = HIGH
000000BA  2            THEN (* Need to set value bits *)
000000BA  2                SET_BITS ( BIT_REC.MASK, VALUE_WORD )
000000CE  2            ELSE (* Need to clear value bits *)
000000CE  2                CLEAR_BITS ( BIT_REC.MASK, VALUE_WORD )
000000E2  2        END; (* Turn signal on *)
000000E6  2      OFF:  (* This signal is supposed to be off *)
000000E6  2        BEGIN (* Turn signal off *)
000000E6  2          SET_BITS ( BIT_REC.MASK, MASK_WORD ); (* Set bits in care/don't
000000FA  2                                                    care mask *)
000000FA  2          IF BIT_REC.TRUE_POLARITY = HIGH
00000106  2            THEN (* Need to clear value bits *)
00000106  2                CLEAR_BITS ( BIT_REC.MASK, VALUE_WORD )
0000011A  2            ELSE (* Need to set value bits *)
0000011A  2                SET_BITS ( BIT_REC.MASK, VALUE_WORD )
0000012E  2        END; (* Turn signal off *)
00000132  2      OTHERWISE (* Don't care *)
00000132  2        BEGIN (* Don't care the signal *)
00000132  2          CLEAR_BITS ( BIT_REC.MASK, MASK_WORD );
00000146  2          SET_BITS ( BIT_REC.MASK, VALUE_WORD )
0000015A  2        END (* Don't care the signal *)
0000015A  2    END (* Of case statement *)
0000017C  2  END;  (* Procedure VALUE_MASK_CHEF *)
```

```
00000000 1  $GLOBPROC OFF$
00000000 1
00000000 1
00000000 1
00000000 1
00000000 1
00000000 1  (*
00000000 1                          ****************************
00000000 1                          ***** CREATE_PRG_WORD *****
00000000 1                          ****************************
00000000 1                                                                        *)
00000000 1  FUNCTION CREATE_PRG_WORD ( VAR RESOURCE:  FUNC_RESOURCE; VAR
00000000 2                             IN_OUT_DESCRIP:  I_O_REC; STATE_SHIFT:
00000000 2                             S_INT ):  L_INT;
00000004 2  (*
00000004 2    Function CREATE_PRG_WORD to create the correct programmed output word
00000004 2    for the given I/O condition of the current state.  Function starts
00000004 2    with the off value, then loops through all possible output signals,
00000004 2    setting/clearing the appropriate output bit depending on whether the
00000004 2    signal is on or off and its polarity.  When all possible output
00000004 2    signals have been programmed, the next state is inserted into the
00000004 2    correct field considering the state shift offset, and the programmed
00000004 2    output word is returned to the caller.
00000004 2
00000004 2    CREATE_PRG_WORD uses the following procedures:  VALUE_MASK_CHEF
00000004 2    and SET_BITS.
00000004 2
00000004 2    Input:  1) RESOURCE, the record describing the indicated function
00000004 2                generator
00000004 2            2) IN_OUT_DESCRIP, the record describing the current input/
00000004 2                output condition of the state being programmed
00000004 2            3) STATE_SHIFT, the number of bits to the left the next
00000004 2                state is to be shifted prior to inserting it into the
00000004 2                programmed output word
00000004 2    Output:  1) the completed programmed output word for this input/output
00000004 2                 condition of the current state of the given function
00000004 2                 generator, in function name
00000004 2
00000004 2                                                                        *)
00000004 2  VAR
00000004 2
00000004 2    J:  OUTPUT_FUNCTIONS; (* FOR loop index *)
00000005 2
00000005 2    DUMMY:  L_INT; (* Dummy mask word to pass VALUE_MASK_CHEF *)
0000000A 2
0000000A 2    PRG_WORD:  L_INT; (* Temporary storage for programmed word *)
00000184 2
00000184 2  BEGIN (* Function CREATE_PRG_WORD *)
00000184 2    (* Initialize program word *)
00000184 2    PRG_WORD := RESOURCE.OFF_VALUE;
0000018E 2    FOR J := START_QUAL TO O_FB_3 DO
00000192 2      WITH IN_OUT_DESCRIP.OUTPUT_ [ J ] DO
000001AC 2        BEGIN (* Set/clear appropriate bits in program word for this
000001AC 2                 signal *)
000001AC 2          MASK := RESOURCE.OUTPUT_MASKS [ J ];
000001C2 2          TRUE_POLARITY := RESOURCE.OUTPUT_POLARS [ J ];
000001DA 2          VALUE_MASK_CHEF ( IN_OUT_DESCRIP.OUTPUT_ [ J ], PRG_WORD,
000001DA 2                            DUMMY )
00000202 2        END; (* Set/clear appropriate bits in program word for this
00000212 2                signal *)
00000212 2    (* Put NEXT_STATE into correct output bits.  This must be done AFTER
00000212 2       setting/clearing the feedback bits because the states share the
00000212 2       same bits!  Also, turn NEXT_STATE into long integer before
00000212 2       shifting it.  This prevents the state from being shifted off the
00000212 2       left into oblivion! *)
00000212 2    SET_BITS ( SHIFT ( L_INT ( IN_OUT_DESCRIP.NEXT_STATE ), STATE_SHIFT ),
00000212 2               PRG_WORD );
0000023E 2    (* Assign function value *)
0000023E 2    CREATE_PRG_WORD := PRG_WORD
00000244 2  END; (* Function CREATE_PRG_WORD *)
00000000 1
```

```
00000000  1
00000000  1
00000000  1
00000000  1
00000000  1  (*
00000000  1                        **************************
00000000  1                        ***** EVAL_FUNCTION *****
00000000  1                        **************************
00000000  1                                                                    *)
00000000  1  %GLOBPROC ON%
00000000  1  FUNCTION EVAL_FUNCTION ( VAR FUNC_DESCRIP:  IN_ARRAY_TYPE; ADRS_MASK:
00000000  2                          L_INT ):  BOOLEAN;
00000001  2  (*
00000001  2    Function EVAL_FUNCTION to evaluate the given function with the
00000001  2    given inputs.  Function scans the function description, which is
00000001  2    expected to be in post-fix notation, stacking operands ( true if
00000001  2    the operand's "bit mask" is set in the given address mask, otherwise
00000001  2    false ), then popping the appropriate number of stacked operands
00000001  2    when an operator is encountered.  Once the operator is applied,
00000001  2    resulting in a true/false condition, the intermediate result is
00000001  2    pushed back onto the stack.  This process is repeated until the
00000001  2    entire function description is exhausted, and the final result is
00000001  2    popped off the stack and returned to the caller.
00000001  2
00000001  2    Note:  the empty input function returns a true condition.  This
00000001  2           allows a state to have an "off" condition with some activity
00000001  2           still allowed ( specified in the empty input function's output
00000001  2           description ).
00000001  2
00000001  2    EVAL_FUNCTION uses the following routines:  PUSH, POP, and TEST_BITS.
00000001  2
00000001  2    Input:  1) FUNC_DESCRIP, an array containing the function to be
00000001  2               evaluated, in post-fix notation
00000001  2            2) ADRS_MASK, the address ( inputs ) with which the function
00000001  2               is to be evaluated
00000001  2    Output:  1) evaluated function value with the given input:
00000001  2                 TRUE if function is true with given input,
00000001  2                 FALSE otherwise
00000001  2                                                                    *)
00000001  2
00000001  2  VAR
00000001  2
00000001  2    I:  S_INT; (* WHILE loop index *)
00000004  2
00000004  2    VALUE_STACK:  STACK_TYPE; (* Stack containing operands/partial
0000000E  2                                 results *)
0000000E  2
0000000E  2    STACK_TOP:  STACK_INDEX; (* Top of stack *)
0000000F  2
0000000F  2    STACK_CODE:  STACK_RETCODE; (* PUSH/POP return code *)
00000010  2
00000010  2    OP_1:  BOOLEAN; (* Storage for first operand *)
00000011  2
00000011  2    OP_2:  BOOLEAN; (* Storage for second operand *)
00000250  2
00000250  2  BEGIN (* Function EVAL_FUNCTION *)
00000250  2    STACK_TOP := -1; (* Initialize top of stack *)
00000256  2    I := 0;
0000025A  2    WHILE FUNC_DESCRIP [ I ].TAG <> END_ DO
00000270  2      BEGIN (* Pick apart the function and evaluate it *)
00000270  2        CASE FUNC_DESCRIP [ I ].TAG OF
00000280  2          OPERAND_:  (* Resource operand *)
00000280  2            WITH FUNC_DESCRIP [ I ].OPERAND DO
00000296  2              BEGIN (* Push whether this resource is true/false in adrs *)
00000296  2                OP_1 := TEST_BITS ( MASK, ADRS_MASK );
000002A8  2                IF ( ( TRUE_POLARITY = HIGH ) AND ( OP_1 = TRUE ) ) OR
000002A8  2                   ( ( TRUE_POLARITY = LOW ) AND ( OP_1 = FALSE ) )
000002E6  2                  THEN (* This resource is true in address *)
000002E6  2                    OP_1 := TRUE
000002F0  2                  ELSE (* This resource is false in address *)
000002F0  2                    OP_1 := FALSE;
000002F4  2                PUSH ( OP_1, VALUE_STACK, STACK_TOP, STACK_CODE )
0000030E  2              END; (* Push whether this resource is true/false in adrs *)
```

```
00000312  2          AND_:  (* AND two operands together *)
00000312  2            BEGIN (* Pop two operands and check if both are true *)
00000312  2              POP ( VALUE_STACK, STACK_TOP, OP_1, STACK_CODE );
0000032C  2              POP ( VALUE_STACK, STACK_TOP, OP_2, STACK_CODE );
00000346  2              IF ( OP_1 = TRUE ) AND ( OP_2 = TRUE )
00000368  2                THEN (* Push true back on *)
00000368  2                  OP_1 := TRUE
00000372  2                ELSE (* Push false back on *)
00000372  2                  OP_1 := FALSE;
00000376  2              PUSH ( OP_1, VALUE_STACK, STACK_TOP, STACK_CODE )
00000390  2            END; (* Pop two operands and check if both are true *)
00000394  2          OR_:  (* OR two operands together *)
00000394  2            BEGIN (* Pop two operands and check if one is true *)
00000394  2              POP ( VALUE_STACK, STACK_TOP, OP_1, STACK_CODE );
000003AE  2              POP ( VALUE_STACK, STACK_TOP, OP_2, STACK_CODE );
000003C8  2              IF ( OP_1 = TRUE ) OR ( OP_2 = TRUE )
000003EA  2                THEN (* Push true back on *)
000003EA  2                  OP_1 := TRUE
000003F4  2                ELSE (* Push false back on *)
000003F4  2                  OP_1 := FALSE;
000003F8  2              PUSH ( OP_1, VALUE_STACK, STACK_TOP, STACK_CODE )
00000412  2            END; (* Pop two operands and check if one is true *)
00000416  2          NOT_:  (* Negate one operand *)
00000416  2            BEGIN (* Pop one operand and negate it *)
00000416  2              POP ( VALUE_STACK, STACK_TOP, OP_1, STACK_CODE );
00000430  2              PUSH ( NOT ( OP_1 ), VALUE_STACK, STACK_TOP, STACK_CODE )
00000450  2            END; (* Pop one operand and negate it *)
00000454  2          OTHERWISE (* Do nothing *)
00000454  2        END; (* Of case statement *)
0000047A  2        I := I + 1 (* Increment index into function description array *)
0000047E  2      END; (* Pick apart the function and evaluate it *)
00000482  2    IF I = 0
0000048A  2      THEN (* Empty function:  return true *)
0000048A  2        OP_1 := TRUE
00000494  2      ELSE (* Function had some input *)
00000494  2        (* Pop final value off stack *)
00000494  2        POP ( VALUE_STACK, STACK_TOP, OP_1, STACK_CODE );
000004AE  2    EVAL_FUNCTION := OP_1 (* Assign final function value *)
000004B4  2  END; (* Function EVAL_FUNCTION *)
00000000  1  SGLOBPROC OFFS
00000000  1
00000000  1
00000000  1
00000000  1
00000000  1
00000000  1  (*
00000000  1                          *************************
00000000  1                          ***** LOAD_LL_RSRCS *****
00000000  1                          *************************
00000000  1                                                                  *)
00000000  1  PROCEDURE LOAD_LL_RSRCS ( VAR LL_ARRAY:  LL_ARRAY_TYPE );
00000000  2  (*
00000000  2    Procedure LOAD_LL_RSRCS to load the low level resources with the
00000000  2    given specifications.  Procedure sinply loops through the low level
00000000  2    resource array, loading up the indicated masks and values at the
00000000  2    indicated locations if the resource is in use.  If not, routine
00000000  2    moves on to the next low level resource.
00000000  2
00000000  2    Input:  1) LL_ARRAY, the low level array data structure describing
00000000  2               usage of the low level resources
00000000  2    Output:  none ( acquisition board memory is written to )
00000000  2                                                                  *)
00000000  2  VAR
00000000  2
00000000  2    I:  LL_RESOURCE_NUMS; (* FOR loop index *)
000004C2  2
000004C2  2  BEGIN (* Procedure LOAD_LL_RSRCS *)
000004C2  2    FOR I := 0 TO MAX_LL_RESOURCES-1 DO
000004C6  2      WITH LL_ARRAY [ I ] DO
000004DC  2        BEGIN (* Load all low level resources *)
000004DC  2          IF LO_TRACE_ID <> -1
000004E8  2            THEN (* The lower part of this resource is being used *)
000004E8  2              BEGIN (* Load the lower part *)
```

```
000004E8  2              LOAD_PTR^.LOWER_MASK := LO_BOUND_MASK;
000004F0  2              LOAD_PTR^.LOWER_VALUE := LO_BOUND_VALUE
000004FE  2            END; (* Load the lower part *)
000004FE  2          IF HI_TRACE_ID <> -1
0000050E  2            THEN (* The upper part of this resource is being used *)
0000050E  2              BEGIN (* Load the upper part *)
0000050E  2                LOAD_PTR^.UPPER_MASK := HI_BOUND_MASK;
00000518  2                LOAD_PTR^.UPPER_VALUE := HI_BOUND_VALUE
00000526  2              END (* Load the upper part *)
00000526  2        END (* Load all low level resources *)
00000536  2  END; (* Procedure LOAD_LL_RSRCS *)
00000000  1
00000000  1
00000000  1
00000000  1
00000000  1
00000000  1  (*
00000000  1                     **************************
00000000  1                     ***** LOAD_HL_RSRCS *****
00000000  1                     **************************
00000000  1                                                                    *)
00000000  1  PROCEDURE LOAD_HL_RSRCS ( VAR LL_ARRAY:  LL_ARRAY_TYPE; VAR HL_ARRAY:
00000000  2                          HL_ARRAY_TYPE; VAR MISC_ARRAY:
00000000  2                          MISC_ARRAY_TYPE );
00000000  2  (*
00000000  2    Procedure LOAD_HL_RSRCS to load the high level resources with the
00000000  2    given specifications.  Procedure loops through the high level
00000000  2    resources, figuring out what low level resources are driving each
00000000  2    particular high level resource and with what signals.  The appropriate
00000000  2    value and mask for each resource are thus created dynamically
00000000  2    ( including the "extra" signals ), and are written to the correct
00000000  2    memory locations for that resource.  This process is repeated for
00000000  2    all high level resources.
00000000  2
00000000  2    LOAD_HL_RSRCS uses the following routine:  VALUE_MASK_CHEF.
00000000  2
00000000  2    Input:  1) LL_ARRAY, the low level array data structure describing
00000000  2               usage of the low level resources
00000000  2            2) HL_ARRAY, the high level array data structure describing
00000000  2               usage of the high level resources
00000000  2            3) MISC_ARRAY, the miscellaneous driver data structure
00000000  2               describing usage of some wild-cat signals
00000000  2    Output:  none ( acquisition board memory is written to )
00000000  2                                                                    *)
00000000  2  VAR
00000000  2
00000000  2    I:  HL_RESOURCE_NUMS; (* FOR loop index *)
00000001  2
00000001  2    J:  LL_SIGNALS; (* FOR loop index *)
00000002  2
00000002  2    K:  LL_RESOURCE_NUMS; (* FOR loop index *)
00000003  2
00000003  2    L:  MISC_DRIVERS; (* FOR loop index *)
00000004  2
00000004  2    VALUE:  L_INT; (* Storage for value of high level resource *)
00000008  2
00000008  2    MASK:  L_INT; (* Storage for mask of high level resource *)
0000053E  2
0000053E  2  BEGIN (* Procedure LOAD_HL_RSRCS *)
0000053E  2    FOR I := 0 TO MAX_HL_RESOURCES-1 DO
00000542  2      WITH HL_ARRAY [ I ] DO
00000558  2        BEGIN (* Load all high level resources *)
00000558  2          VALUE := 0FFFFFFFFH; (* Assume don't care *)
00000560  2          MASK := 0;
00000564  2          FOR J := GE_LO TO LE_HI DO
00000568  2            IF LL_SETS [ J ] <> []
00000584  2              THEN (* There are some low level resources driving this high
00000584  2                      level resource with this signal *)
00000584  2                FOR K := 0 TO MAX_LL_RESOURCES-1 DO
00000588  2                  IF K IN LL_SETS [ J ]
000005B0  2                    THEN (* This low level is one of the drivers *)
000005B0  2                      VALUE_MASK_CHEF ( LL_ARRAY [ K ].LL_OUTPUT [ J ],
000005B0  2                                        VALUE, MASK );
```

```
00000608  2          IF EXTRA_SET <> []
00000618  2            THEN (* There are some extra signals driving this high level
00000618  2                    resource *)
00000618  2              FOR L := OCCUR_TERM TO EXT_STIM DO
0000061C  2                IF L IN EXTRA_SET
00000638  2                  THEN (* This extra signal is on *)
00000638  2                    VALUE_MASK_CHEF ( MISC_ARRAY [ L ], VALUE, MASK );
0000066C  2          (* Now do the actual writes to memory to load this high level
0000066C  2             resource *)
0000066C  2          LOAD_PTR^.LOWER_MASK := MASK;
00000676  2          LOAD_PTR^.LOWER_VALUE := VALUE
00000682  2        END (* Load all high level resources *)
00000694  2  END; (* Procedure LOAD_HL_RSRCS *)
00000000  1
00000000  1
00000000  1
00000000  1
00000000  1
00000000  1  (*
00000000  1                         ***************************
00000000  1                         ***** LOAD_FUNC_GENS *****
00000000  1                         ***************************
00000000  1                                                                     *)
00000000  1  PROCEDURE LOAD_FUNC_GENS ( VAR FUNC_GEN_ARRAY:  F_G_ARRAY_TYPE;
00000000  2                             VAR CON_ARRAY:  CNTRL_ARRAY_TYPE );
00000000  2  (*
00000000  2    Procedure LOAD_FUNC_GENS to load the function generators with the
00000000  2    given specifications.  For each function generator, the following
00000000  2    pattern is followed.  First, the generator is checked to see if it
00000000  2    is being used.  If not, it is turned off.  If it is being used, each
00000000  2    state is programmed up.  The programming of each state involves
00000000  2    programming an appropriate output for each input condition based on
00000000  2    whether the input conditions are met.  This is repeated for all given
00000000  2    input conditions for all states of the function generator.
00000000  2
00000000  2    Note:  the first true input condition found will be the one for which
00000000  2           the output is programmed. Thus, if there is more than one
00000000  2           true condition for a given input, all but the first are
00000000  2           ignored.
00000000  2
00000000  2    LOAD_FUNC_GENS uses the following procedures and functions:
00000000  2    SET_BITS, CLEAR_BITS, CREATE_PRG_WORD, EVAL_FUNCTION, and
00000000  2    WRITE_CNTRL_WRD.
00000000  2
00000000  2    Input:  1) FUNC_GEN_ARRAY, the function generator array data
00000000  2               structure describing usage of the function generators
00000000  2            2) CON_ARRAY, the array describing the condition of
00000000  2               each of the control words/bytes
00000000  2    Output:  1) CON_ARRAY, the updated array describing the condition of
00000000  2                each of the control words/bytes
00000000  2             ( Also, control board memory is written to )
00000000  2                                                                     *)
00000000  2  VAR
00000000  2
00000000  2    I:  FUNC_GEN_TYPES; (* FOR loop index *)
00000001  2
00000001  2    J:  S_INT; (* FOR loop index *)
00000004  2
00000004  2    TEMP_PTR:  S_INT_PTR; (* Temporary storage for long integer
00000008  2                            type change to a pointer *)
00000008  2
00000008  2    STATE_PTR:  STATE_REC_PTR; (* Pointer to current state record *)
0000000C  2
0000000C  2    IN_OUT_PTR:  I_O_REC_PTR; (* Pointer to current input/output
00000010  2                                condition *)
00000010  2
00000010  2    VAL:  L_INT; (* Value to be written to the current memory location *)
00000014  2
00000014  2    ADRS:  L_INT; (* WHILE loop variable for stepping through address
00000018  2                 range *)
00000018  2
00000018  2    MAX_ADRS:  L_INT; (* WHILE loop variable for maximum address *)
0000001C  2
```

```
0000001C  2    CUR_OFF:  L_INT; (* Current off value for generator's state *)
00000020  2
00000020  2    STATE_SHIFT:  S_INT; (* Number of bits to shift state into correct
0000069C  2                          field for this function generator *)
0000069C  2
0000069C  2  BEGIN (* Procedure LOAD_FUNC_GENS *)
0000069C  2    FOR I := X TO Y DO
000006A0  2      WITH FUNC_GEN_ARRAY [ I ] DO
000006B6  2        IF STATE_MACH_PTR = NIL
000006BE  2          THEN (* This function generator is not being used *)
000006BE  2            BEGIN (* Turn it off *)
000006BE  2              (* Force function generator RAM address to 0 *)
000006BE  2              SET_BITS ( RAM_0_ADRS_MASK, CON_ARRAY [ CONTROL_2 ] );
000006D0  2              WRITE_CNTRL_WRD ( CONTROL_2, CON_ARRAY [ CONTROL_2 ] );
000006E2  2              TEMP_PTR := S_INT_PTR ( LOAD_PTR );
000006EA  2              (* Write lower half of off word into memory *)
000006EA  2              TEMP_PTR^ := S_INT ( OFF_VALUE );
000006F8  2              IF I = X
00000700  2                THEN (* Need to write second half of off word *)
00000700  2                  BEGIN (* Write upper half of off word *)
00000700  2                    TEMP_PTR := S_INT_PTR ( LOAD_PTR + 2000H );
00000710  2                    TEMP_PTR^ := S_INT ( SHIFT ( OFF_VALUE, -16 ) )
00000726  2                  END (* Write upper half of off word *)
00000726  2            END (* Turn it off *)
0000072A  2          ELSE (* This function generator is being used *)
0000072A  2            BEGIN (* Load the sucker *)
0000072A  2              (* Allow access to all of function generator RAM *)
0000072A  2              CLEAR_BITS ( RAM_0_ADRS_MASK, CON_ARRAY [ CONTROL_2 ] );
00000740  2              WRITE_CNTRL_WRD ( CONTROL_2, CON_ARRAY [ CONTROL_2 ] );
00000752  2              STATE_PTR := STATE_MACH_PTR; (* Initialize pointer to start
0000075C  2                                              of state machine *)
0000075C  2              WHILE STATE_PTR <> NIL  DO
00000764  2                BEGIN (* Load up this state *)
00000764  2                  (* Create address range for this state *)
00000764  2                  (* Turn CUR_STATE into long integer before shifting it.
00000764  2                     This prevents it from being shifted into never-
00000764  2                     never land.  Also, take into account the number
00000764  2                     of state bits being used for windows:  the more
00000764  2                     bits being used for windows, the larger the state
00000764  2                     starting address and total address space! *)
00000764  2                  ADRS := LOAD_PTR + SHIFT ( L_INT ( STATE_PTR^.
00000764  2                       CUR_STATE ), NUM_WINDOW_BITS + 9 );
00000796  2                  MAX_ADRS := 01FEH;
0000079E  2                  FOR J := 1 TO NUM_WINDOW_BITS DO
000007BA  2                    MAX_ADRS := SHIFT ( MAX_ADRS + 1, 1 );
000007D8  2                  MAX_ADRS := MAX_ADRS + ADRS;
000007E0  2                  CUR_OFF := OFF_VALUE;
000007EA  2                  (* Create off value for this state to assure that the
000007EA  2                    generator stays in this state if condition is false *)
000007EA  2                  IF I = X
000007F2  2                    THEN (* This is X function generator *)
000007F2  2                      STATE_SHIFT := NUM_WINDOW_BITS + 28
00000804  2                    ELSE (* This is Y function generator *)
00000804  2                      STATE_SHIFT := NUM_WINDOW_BITS + 12;
00000816  2                  SET_BITS ( SHIFT ( L_INT ( STATE_PTR^.CUR_STATE ),
00000816  2                           STATE_SHIFT ), CUR_OFF );
00000842  2                  (* Run through I/O nodes and create program words *)
00000842  2                  IN_OUT_PTR := STATE_PTR^.I_O_PTR;
0000084C  2                  WHILE IN_OUT_PTR <> NIL DO
00000854  2                    BEGIN (* Create output prgrm word for this I/O node *)
00000854  2                      IN_OUT_PTR^.OUTPUT_WORD := CREATE_PRG_WORD
00000854  2                         ( FUNC_GEN_ARRAY [ I ], IN_OUT_PTR^,
00000854  2                           STATE_SHIFT );
0000088C  2                      IN_OUT_PTR := IN_OUT_PTR^.NEXT_I_O_PTR
00000896  2                    END; (* Create output prgrm word for this I/O node *)
00000898  2                  WHILE ADRS <= MAX_ADRS DO
000008A4  2                    BEGIN (* Load this address with true or false
000008A4  2                           condition *)
000008A4  2                      (* Initialize pointer to start of input/output
000008A4  2                         conditions for this state *)
000008A4  2                      IN_OUT_PTR := STATE_PTR^.I_O_PTR;
000008AE  2                      (* Assume false condition *)
000008AE  2                      VAL := CUR_OFF;
000008B4  2                      WHILE ( IN_OUT_PTR <> NIL ) AND
```

```
000008B4  2                        ( VAL = CUR_OFF ) DO
000008D2  2                     BEGIN (* Check all input/output conditions *)
000008D2  2                       IF EVAL_FUNCTION ( IN_OUT_PTR^.INPUT_, ADRS ) =
000008D2  2                          TRUE
000008EA  2                         THEN (* This location is for true condition *)
000008EA  2                           VAL := IN_OUT_PTR^.OUTPUT_WORD;
000008F4  2                       (* Move to next input/output condition *)
000008F4  2                       IN_OUT_PTR := IN_OUT_PTR^.NEXT_I_O_PTR
000008FE  2                     END; (* Check all input/output conditions *)
00000900  2                   (* Write lower half of program word into memory *)
00000900  2                   TEMP_PTR := S_INT_PTR ( ADRS );
00000906  2                   TEMP_PTR^ := S_INT ( VAL );
00000910  2                   IF I = X
00000918  2                     THEN (* Need to write second half of word *)
00000918  2                       BEGIN (* Write upper half of program word *)
00000918  2                         TEMP_PTR := S_INT_PTR ( ADRS + 2000H );
00000926  2                         TEMP_PTR^ := S_INT ( SHIFT ( VAL, -16 ) )
00000938  2                       END; (* Write upper half of program word *)
00000938  2                   ADRS := ADRS + 2 (* Move to next word location *)
0000093C  2                 END; (* Load this address with true or false
00000940  2                         condition *)
00000940  2               (* Move to next state *)
00000940  2               STATE_PTR := STATE_PTR^.NEXT_STATE_PTR
00000948  2             END (* Load up this state *)
0000094C  2          END (* Load the sucker *)
0000095E  2  END; (* Procedure LOAD_FUNC_GENS *)
00000000  1
00000000  1
00000000  1
00000000  1
00000000  1
00000000  1  (*
00000000  1                      ******************************
00000000  1                      ***** LOAD_CNTRL_WORDS *****
00000000  1                      ******************************
00000000  1                                                               *)
00000000  1  PROCEDURE LOAD_CNTRL_WORDS ( VAR FEAT_ARRAY:  FEAT_ARRAY_TYPE; VAR
00000000  2                              CON_ARRAY:  CNTRL_ARRAY_TYPE );
00000000  2  (*
00000000  2    Procedure LOAD_CNTRL_WORDS to load the control words/bytes of the
00000000  2    Soda hardware set with the indicated features.  Procedure goes
00000000  2    through each possible feature, determining if it is to be on or off.
00000000  2    In either case, the appropriate control word/byte is updated to
00000000  2    reflect the status of that particular feature.
00000000  2
00000000  2    LOAD_CNTRL_WORDS uses the following procedure:  VALUE_MASK_CHEF.
00000000  2
00000000  2    Input:  1) FEAT_ARRAY, the array describing the status of each
00000000  2               feature to be programmed
00000000  2            2) CON_ARRAY, the array describing the initial condition
00000000  2               of each of the control words/bytes
00000000  2    Output:  1) CON_ARRAY, the array describing the final condition of
00000000  2                each of the control words/bytes to implement all the
00000000  2                input features
00000000  2                                                               *)
00000000  2  VAR
00000000  2
00000000  2    I:  FEATURE_TYPES; (* FOR loop index *)
00000001  2
00000001  2    DUMMY:  L_INT; (* Dummy mask word to pass VALUE_MASK_CHEF *)
00000966  2
00000966  2  BEGIN (* Procedure LOAD_CNTRL_WORDS *)
00000966  2    FOR I := DRIVE_CMC TO FPC_TIME_MODE DO
0000096A  2      WITH FEAT_ARRAY [ I ] DO
0000097E  2        VALUE_MASK_CHEF ( STATUS, CON_ARRAY [ CONTROLLER ], DUMMY )
000009AE  2  END; (* Procedure LOAD_CNTRL_WORDS *)
00000000  1
00000000  1
00000000  1
00000000  1
00000000  1
00000000  1  (*
```

```
00000000 1                    ********************
00000000 1                    ***** LOAD_HW *****
00000000 1                    ********************
00000000 1                                                                    *)
00000000 1  $GLOBPROC ON$
00000000 1  PROCEDURE LOAD_HW ( VAR SPEC:  HW_SPEC_REC; VAR CNTRL_ARRAY:
00000000 2                       CNTRL_ARRAY_TYPE );
00000000 2  (*
00000000 2    Procedure LOAD_HW to load the Soda hardware set with the given
00000000 2    hardware specification.  Procedure assumes that the measurement
00000000 2    has been described in the given hardware structures.  LOAD_HW simply
00000000 2    calls routines to load specific parts of the hardware:  the low level
00000000 2    resources, the high level resources, the fast sequencer, the
00000000 2    micro-code occurence counters, the function generators, the main
00000000 2    occurance counters, and the control words.
00000000 2
00000000 2    WARNING:  LOAD_HW assumes that the hardware is already in load/unload
00000000 2              mode!
00000000 2
00000000 2    LOAD_HW uses the following procedures:  LOAD_LL_RSRCS, LOAD_HL_RSRCS,
00000000 2    LOAD_FSR, LOAD_COUNTERS, LOAD_FUNC_GENS, LOAD_OCCURANCE,
00000000 2    LOAD_CNTRL_WORDS, WRITE_CNTRL_WRD, CLEAR_FP_CNTR, INIT_REGISTERS,
00000000 2    INIT_MAC, and INIT_FSR.
00000000 2
00000000 2    Input:  1) SPEC, a record containing specifications for
00000000 2               usage of the:
00000000 2               a) low level resources,
00000000 2               b) high level resources,
00000000 2               c) fast sequencer,
00000000 2               d) micro-code occurance counters,
00000000 2               e) function generators,
00000000 2               f) misc. signals,
00000000 2               g) occurance counters,
00000000 2               h) extraneous features
00000000 2            2) CNTRL_ARRAY, the control word data structure containing
00000000 2               copies of the current control words
00000000 2    Output:  1) CNTRL_ARRAY, the control word data structure containing
00000000 2                updated copies of the current control words
00000000 2                                                                    *)
00000000 2  VAR
00000000 2
00000000 2    COUNTER_VALUE:  L_INT; (* Storage for floating point counter value *)
000009B6 2
000009B6 2  BEGIN (* Procedure LOAD_HW *)
000009B6 2    (* Clear the floating point counter *)
000009B6 2    CLEAR_FP_CNTR ( CNTRL_ARRAY [ CONTROL_2 ], CNTRL_ARRAY
000009B6 2                    [ CONTROL_BYTE ], COUNTER_VALUE );
000009D0 2    (* Initialize the function generator state registers *)
000009D0 2    INIT_REGISTERS ( CNTRL_ARRAY [ CONTROL_2 ], CNTRL_ARRAY
000009D0 2                     [ CONTROL_BYTE ] );
000009E2 2    (* Initialize MAC *)
000009E2 2    INIT_MAC ( SPEC.START_MAC, CNTRL_ARRAY [ CONTROL_BYTE ] );
000009F8 2    (* Initialize fast sequencer *)
000009F8 2    INIT_FSR ( SPEC.FAST_SEQUENCER, CNTRL_ARRAY );
00000A0C 2    IF SPEC.RSRC_DIRTY = TRUE
00000A1C 2      THEN (* Resource values have changed *)
00000A1C 2        BEGIN (* Load the low and high level resources *)
00000A1C 2          (* Load the low level resources:  easy *)
00000A1C 2          LOAD_LL_RSRCS ( SPEC.LOW_LEVELS );
00000A28 2          (* Load the high level resources:  not so easy *)
00000A28 2          LOAD_HL_RSRCS ( SPEC.LOW_LEVELS, SPEC.HIGH_LEVELS,
00000A28 2                          SPEC.MISC_SIGNALS );
00000A44 2          (* Reset dirty flag *)
00000A44 2          SPEC.RSRC_DIRTY := FALSE
00000A4C 2        END; (* Load the low and high level resources *)
00000A4C 2    IF SPEC.RAM_DIRTY = TRUE
00000A5C 2      THEN (* RAM values have changed *)
00000A5C 2        BEGIN (* Load the fast sequencer and function generator RAM *)
00000A5C 2          (* Load the fast sequencer:  a bitch and a half *)
00000A5C 2          LOAD_FSR ( SPEC.FAST_SEQUENCER, CNTRL_ARRAY );
00000A6C 2          (* Load the func generators:  a real pain but easier than FSR *)
00000A6C 2          LOAD_FUNC_GENS ( SPEC.FUNC_GENERATORS, CNTRL_ARRAY );
```

```
00000A80  2           (* Reset dirty flag *)
00000A80  2           SPEC.RAM_DIRTY := FALSE
00000A88  2         END; (* Load the fast sequencer and function generator RAM *)
00000A88  2      (* Load the occurance counters *)
00000A88  2      LOAD_OCCURANCE ( SPEC.OCCUR_COUNTER, SPEC.TIME_COUNTER );
00000A9A  2      (* Load the micro-code occurence counters *)
00000A9A  2      LOAD_COUNTERS ( SPEC.MICRO_COUNTERS, CNTRL_ARRAY );
00000AAE  2      (* Load the control words *)
00000AAE  2      LOAD_CNTRL_WORDS ( SPEC.FEATURES, CNTRL_ARRAY );
00000AC2  2      (* Write the control words out to memory *)
00000AC2  2      WRITE_CNTRL_WRD ( CONTROL_BYTE, CNTRL_ARRAY [ CONTROL_BYTE ] );
00000AD4  2      WRITE_CNTRL_WRD ( CONTROL_1, CNTRL_ARRAY [ CONTROL_1 ] );
00000AE2  2      WRITE_CNTRL_WRD ( CONTROL_2, CNTRL_ARRAY [ CONTROL_2 ] )
00000AF4  2      (* C'est fini *)
00000AF4  2    END; (* Procedure LOAD_HW *)
00000000  1  $GLOBPROC OFF$
00000000  1  .

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Hardware FSR / Counter Loaders"
00000000  1  PROGRAM XTRA_LOADER,
00000000  1  (*
00000000  1  ****************************** XTRA_LOADER ******************************
00000000  1    XTRA_LOADER is the module which contains all low level loading
00000000  1    routines for xtra stuff, like the fast sequencer, the main counters,
00000000  1    and the micro-code occurance counters.  All other portions of the
00000000  1    hardware loader are contained in the regular loader   XTRA_LOADER is
00000000  1    processor independent.
00000000  1    Author:  Kip Fulghum
00000000  1    Date:  8-2-82  Revised:  9-20-84
00000000  1  ***************************************************************************
00000000  1
00000000  1    XTRA_LOADER is responsible for controlling all loading aspects of the
00000000  1    Soda hardware fast sequencer, the main counters, and the micro-code
00000000  1    occurance counters.  It contains all the basic routines necessary for
00000000  1    loading the "monstrosity" with the given sequencer specification, as
00000000  1    well as the many occurance counters.
00000000  1
00000000  1    XTRA_LOADER contains the following routines:
00000000  1    -Function CREATE_FSR_WRD2 creates the correct second programmed
00000000  1     output word for the given condition of the given state.
00000000  1    -Global procedure INIT_FSR loads the Soda fast sequencer resources
00000000  1     and adder values with the initial values in the given specification.
00000000  1    -Global procedure LOAD_FSR loads the Soda fast sequencer with the
00000000  1     given hardware specification.
00000000  1    -Global procedure LOAD_OCCURANCE loads the main Soda occurance
00000000  1     counters with the given values.
00000000  1    -Global procedure LOAD_COUNTERS loads the micro-code occurance
00000000  1     counters with the given specification.
00000000  1
00000000  1    In addition, XTRA_LOADER uses the following external routines:
00000000  1    INIT_AMI_CHIPS, INIT_ADDER, SET_BITS, CLEAR_BITS, WRITE_CNTRL_WRD,
00000000  1    TOGGLE_CLK_6, VALUE_MASK_CHEF, and EVAL_FUNCTION.
00000000  1                                                                           *)
00000000  1  (*
00000000  1                          **************************
00000000  1                          ***** Include Files *****
00000000  1                          **************************
00000000  1                                                                           *)
00000000  1
00000000  1  #INCLUDE CMD_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  VAR
00000000  1
00000000  1  (*
```

```
00000000 1             ***********************************************
00000000 1             ***** Occurance / Timer Counter Locations *****
00000000 1             ***********************************************
00000000 1                                                               *)
00000000 1
00000000 1 $ORG 410000H$
00000000 1
00000000 1   TIME_CNTR1:  S_INT; (* Main time counter LSW *)
00000000 1
00000000 1 $ORG 412000H$
00000000 1
00000000 1   TIME_CNTR2:  S_INT; (* Main time counter MSW *)
00000000 1
00000000 1 $ORG 414000H$
00000000 1
00000000 1   OCCUR_CNTR:  S_INT; (* Main occurance counter *)
00000000 1
00000000 1 (*
00000000 1           ****************************************************
00000000 1           ***** Micro-Code Occurance Counters Locations *****
00000000 1           ****************************************************
00000000 1                                                               *)
00000000 1
00000000 1 $ORG 22A000H$
00000000 1
00000000 1   MICRO_DATA:  S_INT;   (* Data port for counters:  only lower byte
00000000 1                            significant *)
00000000 1
00000000 1 $ORG 22C000H$
00000000 1
00000000 1   MICRO_NUMBER:  S_INT; (* Adrs port for counters:  only lower byte
00000000 1                            significant *)
00000000 1
00000000 1 $ORG 22E000H$
00000000 1
00000000 1   MAPPER:  MAPPER_TYPE; (* Mapper RAMs:  only lower byte significant *)
00000000 1
00000000 1 $END_ORG$
00000000 1
00000000 1
00000000 1
00000000 1
00000000 1 (*
00000000 1                         ***************************
00000000 1                         ***** INIT_AME_CHIPS *****
00000000 1                         ***************************
00000000 1                                                               *)
00000000 1 PROCEDURE INIT_AME_CHIPS ( CUR_CNTRL_2, CUR_MEM_BYTE, LO_RG_MASK,
00000000 2                            LO_RG_VAL, HI_RG_MASK, HI_RG_VAL,
00000000 2                            LO_EQ_MASK, LO_EQ_VAL, HI_EQ_MASK,
00000000 2                            HI_EQ_VAL:  L_INT ); EXTERNAL;
00000000 1 (*
00000000 1   Procedure INIT_AME_CHIPS to load the fast sequencer AME chips with
00000000 1   their initial values.  Provided as an assembly language external.
00000000 1                                                               *)
00000000 1
00000000 1
00000000 1
00000000 1
00000000 1
00000000 1 (*
00000000 1                           ***********************
00000000 1                           ***** INIT_ADDER *****
00000000 1                           ***********************
00000000 1                                                               *)
00000000 1 PROCEDURE INIT_ADDER ( CUR_CNTRL_2, CUR_MEM_BYTE, ADDER_VAL:
00000000 2                        L_INT ); EXTERNAL;
00000000 1 (*
00000000 1   Procedure INIT_ADDER to load the fast sequencer adder with its
00000000 1   initial value.  Provided as an assembly language external.
00000000 1                                                               *)
00000000 1
00000000 1
```

```
00000000 1
00000000 1
00000000 1
00000000 1 (*
00000000 1                      **********************
00000000 1                      ***** SET_BITS *****
00000000 1                      **********************
00000000 1                                                                  *)
00000000 1 PROCEDURE SET_BITS ( BIT_WORD:  L_INT; VAR SET_WORD:  L_INT ); EXTERNAL;
00000000 1 (*
00000000 1   Procedure SET_BITS to set the bits indicated in BIT_WORD in SET_WORD,
00000000 1   ie "OR" BIT_WORD with SET_WORD.  Provided as an assembly language
00000000 1   external.
00000000 1                                                                  *)
00000000 1
00000000 1
00000000 1
00000000 1
00000000 1
00000000 1 (*
00000000 1                      ************************
00000000 1                      ***** CLEAR_BITS *****
00000000 1                      ************************
00000000 1                                                                  *)
00000000 1 PROCEDURE CLEAR_BITS ( BIT_WORD:  L_INT; VAR CLEAR_WORD:  L_INT );
00000000 2                        EXTERNAL;
00000000 1 (*
00000000 1   Procedure CLEAR_BITS to clear the bits indicated in BIT_WORD in
00000000 1   CLEAR_WORD, ie "NOT" BIT_WORD, then "AND" with CLEAR_WORD.  Provided
00000000 1   as an assembly language external.
00000000 1                                                                  *)
00000000 1
00000000 1
00000000 1
00000000 1
00000000 1
00000000 1 (*
00000000 1                      *****************************
00000000 1                      ***** WRITE_CNTRL_WRD *****
00000000 1                      *****************************
00000000 1                                                                  *)
00000000 1 PROCEDURE WRITE_CNTRL_WRD ( TYPE_WORD:  CNTRLLR_TYPES; CONTROL_VALUE:
00000000 2                             L_INT ); EXTERNAL;
00000000 1 (*
00000000 1   Procedure WRITE_CNTRL_WRD to write the indicated control word out to
00000000 1   its designated location in memory.  Provided as a Pascal external.
00000000 1                                                                  *)
00000000 1
00000000 1
00000000 1
00000000 1
00000000 1
00000000 1 (*
00000000 1                      ************************
00000000 1                      **** TOGGLE_CLK_6 ****
00000000 1                      ************************
00000000 1                                                                  *)
00000000 1 PROCEDURE TOGGLE_CLK_6 ( CUR_CNTRL_2:  L_INT ); EXTERNAL;
00000000 1 (*
00000000 1   Procedure TOGGLE_CLK_6 to toggle clock 6 one time.  Provided as an
00000000 1   assembly language external.
00000000 1                                                                  *)
00000000 1
00000000 1
00000000 1
00000000 1
00000000 1
00000000 1 (*
00000000 1                      *****************************
00000000 1                      ***** VALUE_MASK_CHEF *****
00000000 1                      *****************************
00000000 1                                                                  *)
```

```
00000000 1  PROCEDURE VALUE_MASK_CHEF ( VAR BIT_REC:  CONDITION_REC; VAR VALUE_WORD,
00000000 2                               MASK_WORD:  L_INT ); EXTERNAL;
00000000 1  (*
00000000 1    Procedure VALUE_MASK_CHEF to cook up the correct value/mask
00000000 1    combination for the given signal considering whether you want the
00000000 1    signal on, off, or don't care, and considering the logic polarity
00000000 1    of the signal, ie high true or low true.  Provided as a Pascal
00000000 1    external.
00000000 1                                                                      *)
00000000 1
00000000 1
00000000 1
00000000 1
00000000 1
00000000 1  (*
00000000 1                        *************************
00000000 1                        ***** EVAL_FUNCTION *****
00000000 1                        *************************
00000000 1                                                                      *)
00000000 1  FUNCTION EVAL_FUNCTION ( VAR FUNC_DESCRIP:  IN_ARRAY_TYPE; ADRS_MASK:
00000000 2                          L_INT ):  BOOLEAN; EXTERNAL;
00000000 1  (*
00000000 1    Function EVAL_FUNCTION to evaluate the given function with the
00000000 1    given inputs.  Provided as a Pascal external.
00000000 1                                                                      *)
00000000 1
00000000 1
00000000 1
00000000 1
00000000 1
00000000 1  (*
00000000 1                        ****************************
00000000 1                        ***** CREATE_FSR_WRD2 *****
00000000 1                        ****************************
00000000 1                                                                      *)
00000000 1  FUNCTION CREATE_FSR_WRD2 ( VAR RESOURCE:  FSR_REC_TYPE; VAR
00000000 2                            IN_OUT_DESCRIP:  FI_O_REC;  STATE_SHIFT:
00000000 2                            S_INT ):  L_INT;
00000004 2  (*
00000004 2    Function CREATE_FSR_WRD2 to create the correct second programmed
00000004 2    output word for the given I/O condition of the current state.
00000004 2    Function starts with the initial value, then loops through all
00000004 2    possible output signals, setting/clearing the appropriate output bit
00000004 2    depending on whether the signal is on or off and its polarity.  When
00000004 2    all possible output signals have been programmed, the next state is
00000004 2    inserted into the correct field considering the state shift offset,
00000004 2    and the programmed output word is returned to the caller.
00000004 2
00000004 2    CREATE_FSR_WRD2 uses the following procedures:  VALUE_MASK_CHEF
00000004 2    and SET_BITS.
00000004 2
00000004 2    Input:  1) RESOURCE, the description of the fast sequencer
00000004 2            2) IN_OUT_DESCRIP, the record describing the current input/
00000004 2               output condition of the state being programmed
00000004 2            3) STATE_SHIFT, the number of bits to the left the next
00000004 2               state is to be shifted prior to inserting it into the
00000004 2               programmed output word
00000004 2    Output:  1) the completed second programmed output word for this
00000004 2                input/output condition of the current state of the fast
00000004 2                sequencer, in function name
00000004 2                                                                      *)
00000004 2
00000004 2  VAR
00000004 2
00000004 2    J:  FOUTPUT_FUNCTIONS; (* FOR loop index *)
00000005 2
00000005 2    DUMMY:  L_INT; (* Dummy mask word to pass VALUE_MASK_CHEF *)
0000000A 2
0000000A 2    PRG_WORD:  L_INT; (* Temporary storage for programmed word *)
00000004 2
00000004 2  BEGIN (* Function CREATE_FSR_WRD2 *)
00000004 2    (* Initialize program word *)
00000004 2    PRG_WORD := IN_OUT_DESCRIP.OUTPUT_WORD2;
```

```
0000000E 2    FOR J := STORE_FSR TO FSRY DO
00000012 2      WITH IN_OUT_DESCRIP.OUTPUT_ [ J ] DO
0000002C 2        BEGIN (* Set/clear appropriate bits in program word for this
0000002C 2                signal *)
0000002C 2          MASK := RESOURCE.OUTPUT_MASKS [ J ];
00000042 2          TRUE_POLARITY := RESOURCE.OUTPUT_POLARS [ J ];
0000005A 2          VALUE_MASK_CHEF ( IN_OUT_DESCRIP.OUTPUT_ [ J ], PRG_WORD,
0000005A 2                            DUMMY )
00000082 2        END; (* Set/clear appropriate bits in program word for this
00000092 2              signal *)
00000092 2    (* Put NEXT_STATE into correct output bits.  Also, turn NEXT_STATE
00000092 2       into long integer before shifting it.  This prevents the state
00000092 2       from being shifted off the left into oblivion! *)
00000092 2    SET_BITS ( SHIFT ( L_INT ( IN_OUT_DESCRIP.NEXT_STATE ), STATE_SHIFT ),
00000092 2               PRG_WORD );
000000BE 2    (* Assign function value *)
000000BE 2    CREATE_FSR_WRD2 := PRG_WORD
000000C4 2  END; (* Function CREATE_FSR_WRD2 *)
00000000 1
00000000 1
00000000 1
00000000 1
00000000 1
00000000 1  (*
00000000 1                          ********************
00000000 1                          ***** INIT_FSR *****
00000000 1                          ********************
00000000 1                                                                  *)
00000000 1  $GLOBPROC ON$
00000000 1  PROCEDURE INIT_FSR ( VAR FAST_SQR:  FSR_REC_TYPE; VAR CON_ARRAY:
00000000 2                       CNTRL_ARRAY_TYPE );
000000D0 2  (*
000000D0 2    Procedure INIT_FSR to load the Soda fast sequencer resources and
000000D0 2    adder values with the initial values in the given specification.
000000D0 2    Procedure simply calls lower level routines to initialize the
000000D0 2    address resources and the initial adder value of the fast sequencer.
000000D0 2
000000D0 2    INIT_FSR uses the following routines:  INIT_AME_CHIPS and INIT_ADDER.
000000D0 2
000000D0 2    Input:  1) FAST_SQR, the record describing usage of the fast
000000D0 2               sequencer
000000D0 2            2) CON_ARRAY, the control word data structure containing
000000D0 2               copies of the current control words
000000D0 2    Output:  none ( FSR AME chips and accumulator written to )
000000D0 2                                                                  *)
000000D0 2  BEGIN (* Procedure INIT_FSR *)
000000D0 2    WITH FAST_SQR DO
000000D8 2      BEGIN (* Initialize fast sequencer *)
000000D8 2        INIT_AME_CHIPS ( CON_ARRAY [ CONTROL_2 ], CON_ARRAY
000000D8 2                         [ CONTROL_BYTE ], LO_RG_MASK, LO_RG_VAL,
000000D8 2                         HI_RG_MASK, HI_RG_VAL, LO_EQ_MASK,
000000D8 2                         LO_EQ_VAL, HI_EQ_MASK, HI_EQ_VAL );
0000010E 2        INIT_ADDER ( CON_ARRAY [ CONTROL_2 ], CON_ARRAY
0000010E 2                     [ CONTROL_BYTE ], ADDER_VAL )
0000012C 2      END; (* Initialize fast sequencer *)
0000012C 2  END; (* Procedure INIT_FSR *)
00000000 1  $GLOBPROC OFF$
00000000 1
00000000 1
00000000 1
00000000 1
00000000 1
00000000 1  (*
00000000 1                          ********************
00000000 1                          ***** LOAD_FSR *****
00000000 1                          ********************
00000000 1                                                                  *)
00000000 1  $GLOBPROC ON$
00000000 1  PROCEDURE LOAD_FSR ( VAR FAST_SQR:  FSR_REC_TYPE; VAR CON_ARRAY:
00000000 2                       CNTRL_ARRAY_TYPE );
00000000 2  (*
```

```
00000000  2    Procedure LOAD_FSR to load the fast sequencer with the given
00000000  2    specification.  First, the sequencer is checked to see if it
00000000  2    is being used.  If not, it is turned off.  If it is being used, each
00000000  2    state is programmed up.  The programming of each state involves
00000000  2    programming an appropriate output for each input condition based on
00000000  2    whether the input conditions are met.  This is repeated for all given
00000000  2    input conditions for all states of the fast sequencer.
00000000  2
00000000  2    Note:  the first true input condition found will be the one for which
00000000  2           the output is programmed. Thus, if there is more than one
00000000  2           true condition for a given input, all but the first are
00000000  2           ignored.
00000000  2
00000000  2    LOAD_FSR uses the following routines:  SET_BITS, CLEAR_BITS,
00000000  2    CREATE_FSR_WRD2, EVAL_FUNCTION, and WRITE_CNTRL_WRD.
00000000  2
00000000  2    Input:  1) FAST_SQR, the record describing usage of the fast
00000000  2               sequencer
00000000  2            2) CON_ARRAY, the control word data structure containing
00000000  2               copies of the current control words
00000000  2    Output:  1) CON_ARRAY, the control word data structure containing
00000000  2                updated copies of the current control words
00000000  2                ( Also, control board memory is written to )
00000000  2                                                                      *)
00000000  2
00000000  2  VAR
00000000  2
00000000  2    TEMP_PTR:  S_INT_PTR; (* Temporary storage for long integer
00000004  2                             type change to a pointer *)
00000004  2
00000004  2    STATE_PTR:  FSTATE_REC_PTR; (* Pointer to current state record *)
00000008  2
00000008  2    IN_OUT_PTR:  FI_O_REC_PTR; (* Pointer to current input/output
0000000C  2                                  condition *)
0000000C  2
0000000C  2    VAL1:  L_INT; (* First value to be written to the current memory
00000010  2                     location *)
00000010  2
00000010  2    VAL2:  L_INT; (* Second value to be written to the current memory
00000014  2                     location *)
00000014  2
00000014  2    ADRS:  L_INT; (* WHILE loop variable for stepping through address
00000018  2                     range *)
00000018  2
00000018  2    MAX_ADRS:  L_INT; (* WHILE loop variable for maximum address *)
0000001C  2
0000001C  2    CUR_OFF:  L_INT; (* Current off value for sequencer's state *)
00000134  2
00000134  2  BEGIN (* Procedure LOAD_FSR *)
00000134  2    WITH FAST_SQR DO
0000013C  2      IF STATE_MACH_PTR = NIL
00000144  2        THEN (* The fast sequencer is not being used *)
00000144  2          BEGIN (* Turn it off *)
00000144  2            (* Force fast sequencer RAM address to 0 *)
00000144  2            SET_BITS ( RAM_0_ADRS_MASK, CON_ARRAY [ CONTROL_2 ] );
00000156  2            WRITE_CNTRL_WRD ( CONTROL_2, CON_ARRAY [ CONTROL_2 ] );
00000168  2            TEMP_PTR := S_INT_PTR ( LOAD_PTR + 4000H );
00000178  2            (* Write lower half of off word into memory *)
00000178  2            TEMP_PTR^ := S_INT ( OFF_VALUE )
00000186  2          END (* Turn it off *)
0000018A  2        ELSE (* The fast sequencer is being used *)
0000018A  2          BEGIN (* Load the sucker *)
0000018A  2            (* Allow access to all of fast sequencer RAM *)
0000018A  2            CLEAR_BITS ( RAM_0_ADRS_MASK, CON_ARRAY [ CONTROL_2 ] );
000001A0  2            WRITE_CNTRL_WRD ( CONTROL_2, CON_ARRAY [ CONTROL_2 ] );
000001B2  2            STATE_PTR := STATE_MACH_PTR; (* Initialize pointer to start
000001BC  2                                            of state machine *)
000001BC  2            WHILE STATE_PTR <> NIL  DO
000001C4  2              BEGIN (* Load up this state *)
000001C4  2                (* Create address range for this state *)
000001C4  2                (* Turn CUR_STATE into long integer before shifting it.
000001C4  2                   This prevents it from being shifted into never-
```

```
000001C4  2                 never land *)
000001C4  2              ADRS := LOAD_PTR + SHIFT ( L_INT ( STATE_PTR^.
000001C4  2                    CUR_STATE ), 8 );
000001DC  2              MAX_ADRS := ADRS + 00FEH;
000001E6  2              CUR_OFF := OFF_VALUE;
000001F0  2              (* Create off value for this state to assure that the
000001F0  2                 sequencer stays in this state if conditon is false *)
000001F0  2              SET_BITS ( SHIFT ( L_INT ( STATE_PTR^.CUR_STATE ),
000001F0  2                      11 ), CUR_OFF );
0000020A  2              (* Run through I/O nodes and create program words *)
0000020A  2              IN_OUT_PTR := STATE_PTR^.I_O_PTR;
00000214  2              WHILE IN_OUT_PTR <> NIL DO
0000021C  2                BEGIN (* Create output prgrm word for this I/O node *)
0000021C  2                  IN_OUT_PTR^.OUTPUT_WORD2 := CREATE_FSR_WRD2
0000021C  2                       ( FAST_SQR, IN_OUT_PTR^, 11 );
00000248  2                  IN_OUT_PTR := IN_OUT_PTR^.NEXT_I_O_PTR
00000252  2                END; (* Create output prgrm word for this I/O node *)
00000254  2              WHILE ADRS <= MAX_ADRS DO
00000260  2                BEGIN (* Load this address with true or false
00000260  2                         condition *)
00000260  2                  (* Initialize pointer to start of input/output
00000260  2                     conditions for this state *)
00000260  2                  IN_OUT_PTR := STATE_PTR^.I_O_PTR;
0000026A  2                  (* Assume false condition *)
0000026A  2                  VAL1 := 0;
0000026E  2                  VAL2 := CUR_OFF;
00000274  2                  WHILE ( IN_OUT_PTR <> NIL ) AND ( VAL1 = 0 ) AND
00000274  2                        ( VAL2 = CUR_OFF ) DO
0000029E  2                    BEGIN (* Check all input/output conditions *)
0000029E  2                      IF EVAL_FUNCTION ( IN_OUT_PTR^.INPUT_, ADRS ) =
0000029E  2                         TRUE
000002B6  2                        THEN (* This location is for true condition *)
000002B6  2                          BEGIN (* Set up output words *)
000002B6  2                            VAL1 := IN_OUT_PTR^.OUTPUT_WORD1;
000002C0  2                            VAL2 := IN_OUT_PTR^.OUTPUT_WORD2
000002C6  2                          END; (* Set up output words *)
000002C6  2                      (* Move to next input/output condition *)
000002C6  2                      IN_OUT_PTR := IN_OUT_PTR^.NEXT_I_O_PTR
000002D0  2                    END; (* Check all input/output conditions *)
000002D2  2                  (* Write output words into memory *)
000002D2  2                  TEMP_PTR := S_INT_PTR ( ADRS );
000002D8  2                  TEMP_PTR^ := S_INT ( VAL1 );
000002E2  2                  TEMP_PTR := S_INT_PTR ( ADRS + 2000H );
000002F0  2                  TEMP_PTR^ := S_INT ( SHIFT ( VAL1, -16 ) );
00000302  2                  (* The second value is only 16 bits long *)
00000302  2                  TEMP_PTR := S_INT_PTR ( ADRS + 4000H );
00000310  2                  TEMP_PTR^ := S_INT ( VAL2 );
0000031A  2                  ADRS := ADRS + 2 (* Move to next word location *)
0000031E  2                END; (* Load this address with true or false
00000322  2                         condition *)
00000322  2              (* Move to next state *)
00000322  2              STATE_PTR := STATE_PTR^.NEXT_STATE_PTR
0000032A  2            END (* Load up this state *)
0000032E  2        END (* Load the sucker *)
0000032E  2  END; (* Procedure LOAD_FSR *)
00000000  1  $GLOBPROC OFF$
00000000  1
00000000  1
00000000  1
00000000  1
00000000  1
00000000  1  (*
00000000  1                       **************************
00000000  1                       ***** LOAD_OCCURANCE *****
00000000  1                       **************************
00000000  1                                                                *)
00000000  1  $GLOBPROC ON$
00000000  1  PROCEDURE LOAD_OCCURANCE ( COUNT:  S_INT; TIME:  L_INT );
00000336  2  (*
00000336  2    Procedure LOAD_OCCURANCE to load the main Soda occurance counters
00000336  2    with the given values.  Procedure loads COUNT into the occurance
00000336  2    counter, then TIME into the timer counter ( which can be used as
00000336  2    an occurance count as well ).  Both the counter and the timer are
00000336  2    actually loaded with the 2s complement of the requested count, thus
```

```
00000336  2    1 is the maximum state or time count for either counter!
00000336  2
00000336  2    Input:  1) COUNT, the occurance count to be loaded
00000336  2            2) TIME, the time count to be loaded
00000336  2    Output:  none ( control board memory written to )
00000336  2                                                                      *)
00000336  2  BEGIN (* Procedure LOAD_OCCURANCE *)
00000336  2    (* Write count out to counter location *)
00000336  2    OCCUR_CNTR := -COUNT;
00000342  2    (* Write time out to timer location *)
00000342  2    TIME_CNTR1 := S_INT ( -TIME );
0000034E  2    TIME_CNTR2 := S_INT ( SHIFT ( -TIME, -16 ) )
00000362  2  END; (* Procedure LOAD_OCCURANCE *)
00000000  1  $GLOBPROC OFF$
00000000  1
00000000  1
00000000  1
00000000  1
00000000  1
00000000  1  (*
00000000  1                         **************************
00000000  1                         ***** LOAD_COUNTERS *****
00000000  1                         **************************
00000000  1                                                                      *)
00000000  1  $GLOBPROC ON$
00000000  1  PROCEDURE LOAD_COUNTERS ( MICRO_COUNTS:  CNT_REC_PTR; VAR CON_ARRAY:
00000000  2                            CNTRL_ARRAY_TYPE );
00000000  2  (*
00000000  2    Procedure LOAD_COUNTERS to load the micro-code occurence counters
00000000  2    with the given specification.  If there are no counts, nothing is
00000000  2    done.  Otherwise, the mapper RAMs are set up to count the indicated
00000000  2    addresses.
00000000  2
00000000  2    LOAD_COUNTERS uses the following routines:  WRITE_CNTRL_WRD and
00000000  2    TOGGLE_CLK_6.
00000000  2
00000000  2    Input:  1) MICRO_COUNTS, a pointer to the structure describing the
00000000  2               addresses to be counted - if NIL, there are none
00000000  2            2) CON_ARRAY, the control word data structure containing
00000000  2               copies of the current control words
00000000  2    Output:  1) CON_ARRAY, the control word data structure containing
00000000  2                updated copies of the current control words
00000000  2                ( Also, hardware is written to )
00000000  2                                                                      *)
00000000  2
00000000  2  VAR
00000000  2
00000000  2    ZERO:  S_INT; (* Storage for 0:  needed because a CLR causes a read
00000002  2                    prior to the write, which goofs up the hardware *)
00000002  2
00000002  2    I:  S_INT; (* Multiple FOR loop index *)
00000004  2
00000004  2    CNT_NUM:  S_INT; (* Counter number *)
0000036A  2
0000036A  2  BEGIN (* Procedure LOAD_COUNTERS *)
0000036A  2    IF MICRO_COUNTS <> NIL
00000372  2      THEN (* Micro-code occurance counters need to be loaded *)
00000372  2        BEGIN (* Load the micro-code occurance counters *)
00000372  2          ZERO := 0; (* Initialize ZERO *)
00000376  2
00000376  2          (* Set acq control byte to talk to mapper RAMs *)
00000376  2          CON_ARRAY [ ACQ_BYTE ] := TALK_TO_MAPPER;
00000382  2          WRITE_CNTRL_WRD ( ACQ_BYTE, CON_ARRAY [ ACQ_BYTE ] );
00000394  2
00000394  2          (* Initialize mapper RAMs:  point entire mapper at bit bucket *)
00000394  2          FOR I := 0 TO MAX_MAPPER DO
00000398  2            MAPPER [ I ] := 00FFH;
000003BA  2
000003BA  2          (* Clear all counters *)
000003BA  2          MICRO_DATA := ZERO; (* Clear counter pipeline latch *)
000003C2  2          FOR I := 0 TO MAX_LINE_COUNT DO
000003C6  2            BEGIN (* Clear counter *)
000003C6  2              MICRO_NUMBER := I; (* Point to counter I *)
```

```
000003CE  2              (* This next step is not necessary for production
000003CE  2                 boards, but makes lab prototype boards work *)
000003CE  2              IF I = 0
000003D6  2                THEN (* First counter *)
000003D6  2                  BEGIN (* Do fix for lab prototype boards *)
000003D6  2                    CON_ARRAY [ ACQ_BYTE ] := LAB_PROTO_FIX;
000003E2  2                    WRITE_CNTRL_WRD ( ACQ_BYTE, CON_ARRAY [ ACQ_BYTE ] )
000003F4  2                  END; (* Do fix for lab prototype boards *)
000003F4  2              (* Toggle clock 6 to load 0 from counter pipeline latch to
000003F4  2                 counter I *)
000003F4  2              TOGGLE_CLK_6 ( CON_ARRAY [ CONTROL_2 ] )
00000402  2            END; (* Clear counter *)
00000412  2
00000412  2          (* Set ACQ control byte to talk to mapper RAMs and disable
00000412  2             counters *)
00000412  2          CON_ARRAY [ ACQ_BYTE ] := DISABLE_CNTRS;
0000041E  2          WRITE_CNTRL_WRD ( ACQ_BYTE, CON_ARRAY [ ACQ_BYTE ] );
00000430  2
00000430  2          (* Load mapper RAMs *)
00000430  2          FOR I := 0 TO MICRO_COUNTS^.NUM_LINES-1 DO
00000448  2            BEGIN (* Load RAM *)
00000448  2              (* Determine which mapper location to use, adjusting for
00000448  2                 hardware address bus shifted by 1 *)
00000448  2              CNT_NUM := SHIFT ( SHIFT ( S_INT ( MICRO_COUNTS^.
00000448  2                         LINE_ADRS [ I ] ), 4 ), -4 );
00000462  2              MAPPER [ CNT_NUM ] := I
00000470  2            END (* Load RAM *)
00000482  2        END (* Load the micro-code occurance counters *)
00000482  2  END; (* Procedure LOAD_COUNTERS *)
00000000  1  $GLOBPROC OFF$
00000000  1

508: Warning: field or entry alignment; record or array comparisons may not work

End of compilation, number of errors=    0
00000000  1  "68000" PREPROCESS
00000000  1  $EXTENSIONS ON$
00000000  1  $LIB_ABS_LONG$
00000000  1  $TITLE "Soda Dynamic/Static Controller FOOTDC Utils #1"
00000000  1  PROGRAM FOOT_UTL1;
00000000  1  (*
00000000  1  ****************************** FOOT_UTL1 ******************************
00000000  1    FOOT_UTL1 is the module containing the routines for basic manipulation
00000000  1    of the trace file of the Soda Dynamic and Static Controllers.
00000000  1    Routines necessary for creating and finishing the measurement trace
00000000  1    file are contained in this module.  See FOOT_UTL2 for writing trace
00000000  1    records to the file.  FOOT_UTL1 is processor independent.
00000000  1    Author:  Kip Fulghum
00000000  1    Date:  9-20-82  Revised:  6-1-84
00000000  1  ***********************************************************************
00000000  1
00000000  1    FOOT_UTL1 contains the following routines:
00000000  1    -Procedure CREATE_HEADER creates the header record for the trace
00000000  1     file, which includes the type of measurement, the number of symbols,
00000000  1     as well as the date and time of the measurement.
00000000  1    -Procedure UPDATE_HEADER updates the header of the trace file with
00000000  1     measurement specific information.
00000000  1    -Procedure CREATE_CMD_RC creates the command record in the trace
00000000  1     file from the given description of the command used to initiate
00000000  1     the trace.
00000000  1    -Procedure CREATE_CNFG_RC creates the configuration record in the
00000000  1     trace file from the given description of Soda's configuration at
00000000  1     the time the trace was initiated.
00000000  1    -Procedure CREATE_SYM_RCS sets up the symbol table records from a
00000000  1     table of unique symbols involved in the measurement.  Indexing into
00000000  1     these records allows easy access to symbol information.
00000000  1    -Global procedure START_FOOTDC initiates creation of the trace file
00000000  1     and writes out the header record, the command and configuration
00000000  1     records, and the symbol records.
00000000  1    -Global procedure FINISH_FOOTDC updates the header if necessary and
00000000  1     closes the trace file.
00000000  1
```

```
00000000 1   In addition, FOOT_UTLS uses the following external routines:
00000000 1   P_CREATE, P_OPEN, P_READ, P_WRITE, P_WRITEBACKWARD, P_CLOSE, P_DELETE,
00000000 1   M_CREATE, M_OPEN, M_READ, M_WRITE, M_WRITEBACKWARD, M_CLOSE, M_DELETE,
00000000 1   BPC_READ, and FIND_MEAS.
00000000 1                                                                  *)
00000000 1  (*
00000000 1                         **************************
00000000 1                         ***** Include Files *****
00000000 1                         **************************
00000000 1                                                                  *)
00000000 1
00000000 1  #INCLUDE ER_CONST:SS_DYN
00000000 1
00000000 1  #INCLUDE DEBUG_CONST:SS_DYN
00000000 1
00000000 1  #INCLUDE COM_TYPES:SS_DYN
00000000 1
00000000 1  #INCLUDE FM_TYPES:SS_DYN
00000000 1
00000000 1  #INCLUDE ICMD_DATA:SODAMON
00000000 1
00000000 1  #INCLUDE TRANS_TYPES:SS_DYN
00000000 1
00000000 1  CONST
00000000 1
00000000 1  (*
00000000 1                         ****************************
00000000 1                         ***** Misc. Constants *****
00000000 1                         ****************************
00000000 1                                                                  *)
00000000 1
00000000 1    SODA_ID        = 1008H; (* I.D. of Soda control board *)
00000000 1
00000000 1    BPC_DATE_TIME  = 0FF91H; (* Word address of date in BPC land.  Time
00000000 1                                 follows *)
00000000 1
00000000 1  VAR
00000000 1
00000000 1  $GLOBVAR ONS
00000000 1
00000000 1    FOOTDC_INFO:  FOOTDC_INFO_TYPE; (* Trace file information *)
00000008 1
00000008 1  $GLOBVAR OFFS
00000008 1
00000008 1  $EXTVAR ONS
00000008 1
00000008 1    TRC_FILE_NAME:  FNAME_ARRAY; (* Guess *)
00000008 1
00000008 1    DEBUG_FLAG:  S_INT; (* Flag for debug options *)
00000008 1
00000008 1  $EXTVAR OFFS
00000008 1
00000008 1
00000008 1
00000008 1
00000008 1
00000008 1  $CALL_ABS_LONGS
00000000 1  (*
00000000 1                           *********************
00000000 1                           ***** P_CREATE *****
00000000 1                           *********************
00000000 1                                                                  *)
00000000 1  PROCEDURE P_CREATE ( VAR FNAME:  FNAME_ARRAY; FTYPE, DISC:  S_INT; VAR
00000000 2                       DCB:  DCB_TYPE; BSZ:  S_INT; VAR FMGR_CODE:
00000000 2                       S_INT ); EXTERNAL;
00000000 1  (*
00000000 1    Procedure P_CREATE to interface to the Pisces file manager routine
00000000 1    CREATE.  Parameters are the same, except the error code is returned
00000000 1    as a parameter.
00000000 1                                                                  *)
00000000 1
00000000 1
00000000 1
00000000 1
```

```
00000000 1
00000000 1 (*
00000000 1                          ******************
00000000 1                          ***** P_OPEN *****
00000000 1                          ******************
00000000 1                                                               *)
00000000 1 PROCEDURE P_OPEN ( VAR FNAME:  FNAME_ARRAY; FTYPE, DISC:  S_INT; VAR
00000000 2                   DCB:  DCB_TYPE; BSZ:  S_INT; VAR FMGR_CODE:
00000000 2                   S_INT ); EXTERNAL;
00000000 1 (*
00000000 1   Procedure P_OPEN to interface to the Pisces file manager routine
00000000 1   OPEN.  Parameters are the same, except the error code is returned
00000000 1   as a parameter.
00000000 1                                                               *)
00000000 1
00000000 1
00000000 1
00000000 1
00000000 1
00000000 1 (*
00000000 1                          ******************
00000000 1                          ***** P_READ *****
00000000 1                          ******************
00000000 1                                                               *)
00000000 1 PROCEDURE P_READ ( VAR DCB:  DCB_TYPE; VAR RBUF:  REC_TYPE; LENGTH:
00000000 2                   S_INT; VAR FMGR_CODE:  S_INT ); EXTERNAL;
00000000 1 (*
00000000 1   Procedure P_READ to interface to the Pisces file manager routine
00000000 1   READ.  Parameters are the same, except the error code is returned
00000000 1   as a parameter.
00000000 1                                                               *)
00000000 1
00000000 1
00000000 1
00000000 1
00000000 1
00000000 1 (*
00000000 1                          *******************
00000000 1                          ***** P_WRITE *****
00000000 1                          *******************
00000000 1                                                               *)
00000000 1 PROCEDURE P_WRITE ( VAR DCB:  DCB_TYPE; VAR RBUF:  REC_TYPE; VAR
00000000 2                     FMGR_CODE:  S_INT ); EXTERNAL;
00000000 1 (*
00000000 1   Procedure P_WRITE to interface to the Pisces file manager routine
00000000 1   WRITE.  Parameters are the same, except the error code is returned
00000000 1   as a parameter.
00000000 1                                                               *)
00000000 1
00000000 1
00000000 1
00000000 1
00000000 1
00000000 1 (*
00000000 1                       ****************************
00000000 1                       ***** P_WRITEBACKWARD *****
00000000 1                       ****************************
00000000 1                                                               *)
00000000 1 PROCEDURE P_WRITEBACKWARD ( VAR DCB:  DCB_TYPE; VAR RBUF:  REC_TYPE; VAR
00000000 2                             FMGR_CODE:  S_INT ); EXTERNAL;
00000000 1 (*
00000000 1   Procedure P_WRITEBACKWARD to interface to the Pisces file manager
00000000 1   routine WRITEBACKWARD.  Parameters are the same, except the error code
00000000 1   is returned as a parameter.
00000000 1                                                               *)
00000000 1
00000000 1
00000000 1
00000000 1
00000000 1
00000000 1 (*
00000000 1                          *******************
00000000 1                          ***** P_CLOSE *****
00000000 1                          *******************
```

```
00000000  1                                                                *)
00000000  1  PROCEDURE P_CLOSE ( VAR DCB:  DCB_TYPE; VAR FMGR_CODE:  S_INT );
00000000  2                    EXTERNAL;
00000000  1  (*
00000000  1    Procedure P_CLOSE to interface to the Pisces file manager routine
00000000  1    CLOSE.  Parameters are the same, except the error code is returned
00000000  1    as a parameter.
00000000  1                                                                *)
00000000  1
00000000  1
00000000  1
00000000  1
00000000  1
00000000  1  (*
00000000  1                        *********************
00000000  1                        ***** P_DELETE *****
00000000  1                        *********************
00000000  1                                                                *)
00000000  1  PROCEDURE P_DELETE ( VAR FNAME:  FNAME_ARRAY; FTYPE, DISC:  S_INT; VAR
00000000  2                     DCB:  DCB_TYPE; VAR FMGR_CODE:  S_INT ); EXTERNAL;
00000000  1  (*
00000000  1    Procedure P_DELETE to interface to the Pisces file manager routine
00000000  1    DELETE.  Parameters are the same, except the error code is returned
00000000  1    as a parameter.
00000000  1                                                                *)
00000000  1
00000000  1
00000000  1
00000000  1
00000000  1
00000000  1  (*
00000000  1                        *********************
00000000  1                        ***** M_CREATE *****
00000000  1                        *********************
00000000  1                                                                *)
00000000  1  PROCEDURE M_CREATE ( VAR FNAME:  FNAME_ARRAY; FTYPE, DISC:  S_INT; VAR
00000000  2                     DCB:  DCB_TYPE; BSZ:  S_INT; VAR FMGR_CODE:
00000000  2                     S_INT ); EXTERNAL;
00000000  1  (*
00000000  1    Procedure M_CREATE to "create" the trace memory file.  Provided as
00000000  1    a Pascal external.
00000000  1                                                                *)
00000000  1
00000000  1
00000000  1
00000000  1
00000000  1
00000000  1  (*
00000000  1                        *******************
00000000  1                        ***** M_OPEN *****
00000000  1                        *******************
00000000  1                                                                *)
00000000  1  PROCEDURE M_OPEN ( VAR FNAME:  FNAME_ARRAY; FTYPE, DISC:  S_INT; VAR
00000000  2                   DCB:  DCB_TYPE; BSZ:  S_INT; VAR FMGR_CODE:
00000000  2                   S_INT ); EXTERNAL;
00000000  1  (*
00000000  1    Procedure M_OPEN to "open" the trace memory file.  Provided as a
00000000  1    Pascal external.
00000000  1                                                                *)
00000000  1
00000000  1
00000000  1
00000000  1
00000000  1
00000000  1  (*
00000000  1                        *******************
00000000  1                        ***** M_READ *****
00000000  1                        *******************
00000000  1                                                                *)
00000000  1  PROCEDURE M_READ ( VAR DCB:  DCB_TYPE; VAR RBUF:  REC_TYPE; LENGTH:
00000000  2                   S_INT; VAR FMGR_CODE:  S_INT ); EXTERNAL;
00000000  1  (*
00000000  1    Procedure M_READ to "read" from the trace memory file.  Provided as
00000000  1    a Pascal external.
00000000  1                                                                *)
```

```
(*
                         ********************
                         ***** M_WRITE *****
                         ********************
                                                                  *)
PROCEDURE M_WRITE ( VAR DCB:  DCB_TYPE; VAR RBUF:  REC_TYPE; VAR
                    FMGR_CODE:  S_INT ); EXTERNAL;
(*
  Procedure M_WRITE to "write" to the trace memory file.  Provided as
  a Pascal external.
                                                                  *)

(*
                      ****************************
                      ***** M_WRITEBACKWARD *****
                      ****************************
                                                                  *)
PROCEDURE M_WRITEBACKWARD ( VAR DCB:  DCB_TYPE; VAR RBUF:  REC_TYPE; VAR
                            FMGR_CODE:  S_INT ); EXTERNAL;
(*
  Procedure M_WRITEBACKWARD to "writebackward" to the trace memory.
  Provided as a Pascal external.
                                                                  *)

(*
                         ********************
                         ***** M_CLOSE *****
                         ********************
                                                                  *)
PROCEDURE M_CLOSE ( VAR DCB:  DCB_TYPE; VAR FMGR_CODE:  S_INT );
                    EXTERNAL;
(*
  Procedure M_CLOSE to "close" the trace memory file.  Provided as a
  Pascal external.
                                                                  *)

(*
                         *********************
                         ***** M_DELETE *****
                         *********************
                                                                  *)
PROCEDURE M_DELETE ( VAR FNAME:  FNAME_ARRAY; FTYPE, DISC:  S_INT; VAR
                     DCB:  DCB_TYPE; VAR FMGR_CODE:  S_INT ); EXTERNAL;
(*
  Procedure M_DELETE to "delete" the trace memory file.  Provided as
  a Pascal external.
                                                                  *)

(*
                         *********************
                         ***** BPC_READ *****
                         *********************
                                                                  *)
```

```
00000000  1  PROCEDURE BPC_READ ( ADDR_68K:  L_INT; ADDR_BPC, LENGTH:  S_INT );
00000000  2                      EXTERNAL;
00000000  1  (*
00000000  1    Procedure BPC_READ to read memory locations over in the BPC
00000000  1    processor's memory.  68000 is byte address, BPC is word address,
00000000  1    length in words.  Provided as part of the message handler.
00000000  1                                                                    *)
00000000  1
00000000  1
00000000  1
00000000  1
00000000  1
00000000  1  $CALL_PC_SHORTS
00000000  1  (*
00000000  1                          *********************
00000000  1                          ***** FIND_MEAS *****
00000000  1                          *********************
00000000  1                                                                    *)
00000000  1  FUNCTION FIND_MEAS ( VAR MEAS_STRUCT:  CMD_DATA_ARRAY ):  S_INT;
00000002  2                      EXTERNAL;
00000000  1  (*
00000000  1    Function FIND_MEAS to return the index of the record in the user
00000000  1    measurement structure describing the type of measurement.  Provided
00000000  1    as a Pascal external.
00000000  1                                                                    *)
00000000  1
00000000  1
00000000  1
00000000  1
00000000  1
00000000  1  (*
00000000  1                          *************************
00000000  1                          ***** CREATE_HEADER *****
00000000  1                          *************************
00000000  1                                                                    *)
00000000  1  PROCEDURE CREATE_HEADER ( MSRMNT_TYPE:  OP_CODES; SYM_COUNT, TRIG_LOC:
00000000  2                            S_INT; VAR FM_CODE:  S_INT );
00000000  2  (*
00000000  2    Procedure CREATE_HEADER to create the header record for the trace
00000000  2    file, which includes the type of measurement, the number of symbols,
00000000  2    the date and time of the measurement, as well as display information.
00000000  2
00000000  2    CREATE_HEADER uses the following routines:  P_WRITE, M_WRITE, and
00000000  2    BPC_READ.
00000000  2
00000000  2    Input:  1) MSRMNT_TYPE, the type of measurement data the trace file
00000000  2               will contain
00000000  2            2) SYM_COUNT, the number of symbols involved in the
00000000  2               measurement
00000000  2            3) TRIG_LOC, the trigger location:  0 = start, 1 = center,
00000000  2               2 = end
00000000  2    Output:  1) FM_CODE, a return code describing what happened:
00000000  2                  0 indicates no error:  header record completed
00000000  2                  3 indicates file not found:  invalid DCB ( should never
00000000  2                    happen )
00000000  2                  5 indicates no free pages available
00000000  2                  7 indicates file corrupt
00000000  2                                                                    *)
00000000  2  VAR
00000000  2
00000000  2    REC_PTR:  REC_PTR_TYPE; (* Pointer to record buffer *)
00000004  2
00000004  2  BEGIN (* Procedure CREATE_HEADER *)
00000004  2    NEW ( REC_PTR ); (* Create space for header record *)
00000016  2    REC_PTR^ [ 0 ] := 8; (* Set record length *)
0000001E  2    REC_PTR^ [ 1 ] := SODA_ID; (* Put Soda control board I.D. in file *)
00000028  2    (* Put date and time into buffer *)
00000028  2    REC_PTR^ [ 2 ] := 0; (* Zero out for when msg handler isn't there *)
00000030  2    REC_PTR^ [ 3 ] := 0;
00000038  2    BPC_READ ( L_INT ( ADDR ( REC_PTR^ [ 2 ] ) ), BPC_DATE_TIME, 2 );
00000052  2    (* Put number of symbols in file *)
00000052  2    REC_PTR^ [ 4 ] := SYM_COUNT;
0000005C  2    (* Put type of measurement *)
0000005C  2    REC_PTR^ [ 5 ] := S_INT ( MSRMNT_TYPE );
```

```
0000006A  2    (* Put trigger location in record *)
0000006A  2    REC_PTR^ [ 6 ] := TRIG_LOC;
00000074  2    (* Zero out values which will be updated after measurement *)
00000074  2    REC_PTR^ [ 7 ] := 0;
0000007C  2    REC_PTR^ [ 8 ] := 0;
00000084  2    (* Finally, write the header record out to the file *)
00000084  2    M_WRITE ( FOOTDC_INFO.DCB, REC_PTR^, FM_CODE );
000000A0  2    IF DEBUG_FLAG = DEBUG_FOOTDC
000000AC  2      THEN (* Debug option on *)
000000AC  2        P_WRITE ( FOOTDC_INFO.DCB, REC_PTR^, FM_CODE );
000000C3  2    DISPOSE ( REC_PTR ) (* Get rid of buffer *)
000000DA  2  END; (* Procedure CREATE_HEADER *)
00000000  1
00000000  1
00000000  1
00000000  1
00000000  1
00000000  1  (*
00000000  1                          **************************
00000000  1                          ***** UPDATE_HEADER *****
00000000  1                          **************************
00000000  1                                                                *)
00000000  1  PROCEDURE UPDATE_HEADER ( VAR FM_CODE:  S_INT );
00000000  2  (*
00000000  2    Procedure UPDATE_HEADER to update the header of the trace file
00000000  2    with measurement specific information.  It closes the trace file,
00000000  2    re-opens it, reads the first record, modifies it appropriately, then
00000000  2    writes the record out backwards.
00000000  2
00000000  2    WARNING:  this routine leaves the file positioned at the beginning!
00000000  2              So, unless you really know what you're doing, you should
00000000  2              not write to the file again!
00000000  2
00000000  2    UPDATE_HEADER uses the following routines:  P_CLOSE, P_OPEN, P_READ,
00000000  2    P_WRITEBACKWARD, M_CLOSE, M_OPEN, M_READ, and M_WRITEBACKWARD.
00000000  2
00000000  2    Input:  none - global structure FOOTDC_INFO is referenced
00000000  2    Output:  1) FM_CODE, a return code describing what happened:
00000000  2                 0 indicates no error:  header updated
00000000  2                 1 indicates end of file ( should never happen )
00000000  2                 2 indicates invalid disc ( should never happen )
00000000  2                 3 indicates file not found:  invalid DCB ( should never
00000000  2                   happen )
00000000  2                 5 indicates no free pages available
00000000  2                 7 indicates file corrupt
00000000  2                                                                *)
00000000  2  VAR
00000000  2
00000000  2    REC_PTR:  REC_PTR_TYPE; (* Pointer to record buffer *)
00000004  2
00000004  2    REAR_PTR:  REC_PTR_TYPE; (* Pointer to rear of buffer *)
000000E2  2
000000E2  2  BEGIN (* Procedure UPDATE_HEADER *)
000000E2  2    NEW ( REC_PTR ); (* Create space for record *)
000000F4  2    REAR_PTR := REC_PTR_TYPE ( ADDR ( REC_PTR^ [ 9 ] ) );
00000100  2    M_CLOSE ( FOOTDC_INFO.DCB, FM_CODE );
00000112  2    IF FM_CODE = NO_ERROR
0000011C  2      THEN (* Trace file is now closed *)
0000011C  2        M_OPEN ( TRC_FILE_NAME, TRC_FILE_TYPE, DISC_NO, FOOTDC_INFO.DCB,
0000011C  2                 BUFFER_SIZE, FM_CODE ); (* Re-open it *)
00000142  2    IF FM_CODE = NO_ERROR
0000014C  2      THEN (* File is re-opened *)
0000014C  2        M_READ ( FOOTDC_INFO.DCB, REC_PTR^, MAX_REC_LENGTH, FM_CODE );
0000016C  2    IF FM_CODE = NO_ERROR
00000176  2      THEN (* Have just read header *)
00000176  2        BEGIN (* Update the thing *)
00000176  2          REC_PTR^ [ 9 ] := 800H; (* Set length going backwards:  upper
00000180  2                                     byte *)
00000180  2          REC_PTR^ [ 8 ] := FOOTDC_INFO.MIN_INDENT;
0000018A  2          REC_PTR^ [ 7 ] := FOOTDC_INFO.CENTER_REC;
00000194  2          M_WRITEBACKWARD ( FOOTDC_INFO.DCB, REAR_PTR^, FM_CODE )
000001B0  2        END; (* Update the thing *)
000001B0  2    IF DEBUG_FLAG = DEBUG_FOOTDC
000001BC  2      THEN (* Debug option on *)
```

```
000001BC  2        BEGIN (* Ship to file *)
000001BC  2          P_CLOSE ( FOOTDC_INFO.DCB, FM_CODE );
000001CE  2          IF FM_CODE = NO_ERROR
000001D8  2            THEN (* Trace file is now closed *)
000001D8  2              P_OPEN ( TRC_FILE_NAME, TRC_FILE_TYPE, DISC_NO, FOOTDC_INFO.
000001D8  2                       DCB, BUFFER_SIZE, FM_CODE ); (* Re-open it *)
000001FE  2          IF FM_CODE = NO_ERROR
00000208  2            THEN (* File is re-opened *)
00000208  2              P_READ ( FOOTDC_INFO.DCB, REC_PTR^, MAX_REC_LENGTH,
00000208  2                       FM_CODE );
00000228  2          IF FM_CODE = NO_ERROR
00000232  2            THEN (* Have just read header *)
00000232  2              BEGIN (* Update the thing *)
00000232  2                REC_PTR^ [ 9 ] := 800H; (* Set length going backwards:
0000023C  2                                           upper byte *)
0000023C  2                REC_PTR^ [ 8 ] := FOOTDC_INFO.MIN_INDENT;
00000246  2                REC_PTR^ [ 7 ] := FOOTDC_INFO.CENTER_REC;
00000250  2                P_WRITEBACKWARD ( FOOTDC_INFO.DCB, REAR_PTR^, FM_CODE )
0000026C  2              END (* Update the thing *)
0000026C  2        END; (* Ship to file *)
0000026C  2    DISPOSE ( REC_PTR ) (* Release it *)
0000027E  2  END; (* Procedure UPDATE_HEADER *)
00000000  1
00000000  1
00000000  1
00000000  1
00000000  1
00000000  1  (*
00000000  1                        **************************
00000000  1                        ***** CREATE_CMD_RC *****
00000000  1                        **************************
00000000  1                                                                   *)
00000000  1  PROCEDURE CREATE_CMD_RC ( VAR CMD_DESCRIP:  CMD_REC_TYPE; VAR FM_CODE:
00000000  2                            S_INT );
00000000  2  (*
00000000  2    Procedure CREATE_CMD_RC to create the command record in the trace
00000000  2    file from the given description of the command used to initiate
00000000  2    the trace.
00000000  2
00000000  2    CREATE_CMD_RC uses the following procedures:  P_WRITE and M_WRITE.
00000000  2
00000000  2    Input:  1) CMD_DESCRIP, the description of the command used to create
00000000  2               the measurement
00000000  2    Output:  1) FM_CODE, the file manager return code indicating how the
00000000  2                write went:
00000000  2                  0 indicates no error:  command record completed
00000000  2                  3 indicates file not found:  invalid DCB ( should never
00000000  2                    happen )
00000000  2                  5 indicates no free pages available
00000000  2                  7 indicates file corrupt
00000000  2                                                                   *)
00000000  2  VAR
00000000  2
00000000  2    REC_PTR:  REC_PTR_TYPE; (* Pointer to record buffer *)
00000286  2
00000286  2  BEGIN (* Procedure CREATE_CMD_RC *)
00000286  2    REC_PTR := REC_PTR_TYPE ( ADDR ( CMD_DESCRIP ) );
0000028E  2    (* Write the command record out to the file *)
0000028E  2    M_WRITE ( FOOTDC_INFO.DCB, REC_PTR^, FM_CODE );
000002AA  2    IF DEBUG_FLAG = DEBUG_FOOTDC
000002B6  2      THEN (* Debug option on *)
000002B6  2        P_WRITE ( FOOTDC_INFO.DCB, REC_PTR^, FM_CODE )
000002D2  2  END; (* Procedure CREATE_CMD_RC *)
00000000  1
00000000  1
00000000  1
00000000  1
00000000  1
00000000  1  (*
00000000  1                        ***************************
00000000  1                        ***** CREATE_CNFG_RC *****
00000000  1                        ***************************
00000000  1                                                                   *)
```

```
00000000  1  PROCEDURE CREATE_CNFG_RC ( VAR CNFG_DESCRIP:  CONFIG_REC_TYPE; VAR
00000000  2                            FM_CODE:  S_INT );
00000000  2  (*
00000000  2    Procedure CREATE_CNFG_RC to create the configuration record in the
00000000  2    trace file from the given description of Soda's configuration at
00000000  2    the time the trace was initiated.
00000000  2
00000000  2    CREATE_CNFG_RC uses the following procedures:  P_WRITE and M_WRITE.
00000000  2
00000000  2    Input:  1) CNFG_DESCRIP, the description of the configuration in
00000000  2               effect during the measurement
00000000  2    Output:  1) FM_CODE, the file manager return code indicating how the
00000000  2                write went:
00000000  2                  0 indicates no error:  configuration record completed
00000000  2                  3 indicates file not found:  invalid DCB ( should never
00000000  2                    happen )
00000000  2                  5 indicates no free pages available
00000000  2                  7 indicates file corrupt
00000000  2                                                                     *)
00000000  2  VAR
00000000  2
00000000  2    REC_PTR:  REC_PTR_TYPE; (* Pointer to record buffer *)
000002DA  2
000002DA  2  BEGIN (* Procedure CREATE_CNFG_RC *)
000002DA  2    REC_PTR := REC_PTR_TYPE ( ADDR ( CNFG_DESCRIP ) );
000002E2  2    (* Write the configuration record out to the file *)
000002E2  2    M_WRITE ( FOOTDC_INFO.DCB, REC_PTR^, FM_CODE );
000002FE  2    IF DEBUG_FLAG = DEBUG_FOOTDC
0000030A  2      THEN (* Debug option on *)
0000030A  2        P_WRITE ( FOOTDC_INFO.DCB, REC_PTR^, FM_CODE )
00000326  2  END; (* Procedure CREATE_CNFG_RC *)
00000000  1
00000000  1
00000000  1
00000000  1
00000000  1
00000000  1  (*
00000000  1                         ***************************
00000000  1                         ***** CREATE_SYM_RCS *****
00000000  1                         ***************************
00000000  1                                                                     *)
00000000  1  PROCEDURE CREATE_SYM_RCS ( VAR MEAS_DESCRIP:  CMD_DATA_ARRAY; VAR
00000000  2                            SYMS:  SYM_DESCRIPS; VAR FM_CODE:  S_INT );
00000000  2  (*
00000000  2    Procedure CREATE_SYM_RCS to set up the symbol table records from a
00000000  2    table of unique symbols involved in the measurement.  Indexing into
00000000  2    these records allows easy access to symbol information.  Procedure
00000000  2    indexes through the given unique symbol table.  For each symbol,
00000000  2    it writes out the symbol header record ( path information, etc ), then
00000000  2    the data base information relating to that symbol.
00000000  2
00000000  2    CREATE_SYM_RCS uses the following routines:  P_WRITE and M_WRITE.
00000000  2
00000000  2    Input:  1) MEAS_DESCRIP, the structure describing the measurement
00000000  2               from the user's point of view
00000000  2            2) SYMS, a record indicating all unique symbols that
00000000  2               were traced
00000000  2    Output:  1) FM_CODE, a return code describing what happened:
00000000  2                  0 indicates no error:  symbol table completed
00000000  2                  3 indicates file not found:  invalid DCB ( should never
00000000  2                    happen )
00000000  2                  5 indicates no free pages available
00000000  2                  7 indicates file corrupt
00000000  2                                                                     *)
00000000  2  VAR
00000000  2
00000000  2    REC_PTR:  REC_PTR_TYPE; (* Pointer to record buffer *)
00000004  2
00000004  2    I:  S_INT; (* WHILE loop index *)
00000006  2
00000006  2    J:  S_INT; (* FOR loop index *)
00000008  2
00000008  2    WORDS_LEFT:  S_INT; (* # of words of database info left to move *)
0000000A  2
```

```
0000000A  2    WORDS_TO_GO:  S_INT; (* # of words to be written out this time *)
0000000C  2
0000000C  2    PTR:  S_INT_PTR; (* Moving pointer into database information *)
0000032E  2
0000032E  2  BEGIN (* Procedure CREATE_SYM_RCS *)
0000032E  2    FM_CODE := NO_ERROR; (* Predict no error *)
00000334  2    NEW ( REC_PTR ); (* Create space for record *)
00000346  2    I := 0; (* Start with first symbol:  0th entry in symbol array *)
0000034A  2    WHILE ( I < SYMS.SYMBOL_COUNT ) AND ( FM_CODE = NO_ERROR ) DO
0000036C  2      WITH MEAS_DESCRIP [ SYMS.SYMBOL_ARRAY [ I ].DESCRIP_INDEX ] DO
0000038C  2        BEGIN (* Move symbol information into record *)
0000038C  2          REC_PTR^ [ 0 ] := 19; (* Set symbol header record length *)
00000394  2          FOR J := 0 TO 7 DO
00000398  2            BEGIN (* Move file name and procedure name into record *)
00000398  2              REC_PTR^ [ J+1 ] := FILE_NAME [ J ];
000003B8  2              REC_PTR^ [ J+11 ] := PROC_NAME [ J ]
000003DA  2            END; (* Move file name and procedure name into record *)
000003EA  2          (* Move disc number into record *)
000003EA  2          REC_PTR^ [ 9 ] := DISC_NUM;
000003F0  2          (* Move language into record *)
000003F8  2          REC_PTR^ [ 10 ] := LANGUAGE;
00000406  2          (* Move number of words of data base info into record *)
00000406  2          REC_PTR^ [ 19 ] := DB_LENGTH;
00000414  2          (* Write out symbol header record *)
00000414  2          M_WRITE ( FOOTDC_INFO.DCB, REC_PTR^, FM_CODE );
00000430  2          IF DEBUG_FLAG = DEBUG_FOOTDC
0000043C  2            THEN (* Debug option on *)
0000043C  2              P_WRITE ( FOOTDC_INFO.DCB, REC_PTR^, FM_CODE );
00000458  2          IF FM_CODE = NO_ERROR
00000462  2            THEN (* Symbol header record has been written *)
00000462  2              BEGIN (* Write out symbol data base information *)
00000462  2                WORDS_LEFT := DB_LENGTH;
0000046C  2                PTR := S_INT_PTR ( DB_PTR );
00000472  2                WHILE ( WORDS_LEFT > 0 ) AND ( FM_CODE = NO_ERROR ) DO
0000048E  2                  BEGIN (* Move data base information into record *)
0000048E  2                    IF WORDS_LEFT > MAX_REC_LENGTH
0000049A  2                      THEN (* All words don't fit in record *)
0000049A  2                        WORDS_TO_GO := MAX_REC_LENGTH
000004A4  2                      ELSE (* All remaining words fit in a record *)
000004A4  2                        WORDS_TO_GO := WORDS_LEFT;
000004AA  2                    (* Set record length *)
000004AA  2                    REC_PTR^ [ 0 ] := WORDS_TO_GO;
000004B2  2                    FOR J := 1 TO WORDS_TO_GO DO
000004C8  2                      BEGIN (* Move a word *)
000004C8  2                        REC_PTR^ [ J ] := PTR^;
000004DA  2                        PTR := S_INT_PTR ( L_INT ( PTR ) + 2 )
000004E4  2                      END; (* Move a word *)
000004F6  2                    (* Write data base information record *)
000004F6  2                    M_WRITE ( FOOTDC_INFO.DCB, REC_PTR^, FM_CODE );
00000512  2                    IF DEBUG_FLAG = DEBUG_FOOTDC
0000051E  2                      THEN (* Debug option on *)
0000051E  2                        P_WRITE ( FOOTDC_INFO.DCB, REC_PTR^, FM_CODE );
0000053A  2                    WORDS_LEFT := WORDS_LEFT - WORDS_TO_GO
00000542  2                  END (* Move data base information into record *)
00000546  2              END; (* Write out symbol data base information *)
00000546  2          I := I + 1 (* Increment index *)
0000054A  2        END; (* Move symbol information into record *)
0000054E  2    DISPOSE ( REC_PTR )  (* Return space for record to heap *)
00000560  2  END; (* Procedure CREATE_SYM_RCS *)
00000000  1
00000000  1
00000000  1
00000000  1
00000000  1
00000000  1  (*
00000000  1                        *************************
00000000  1                        ***** START_FOOTDC *****
00000000  1                        *************************
00000000  1                                                                        *)
00000000  1  $GLOBPROC ON$
00000000  1  PROCEDURE START_FOOTDC ( VAR TOTAL_MEAS:  TOTAL_MEAS_REC; VAR SYMBOLS:
00000000  2                        SYM_DESCRIPS; VAR RET_CODE:  S_INT );
00000000  2  (*
```

```
00000000 2    Procedure START_FOOTDC to initiate creation of the trace file
00000000 2    and write out the header record, the command and configuration
00000000 2    records, and the symbol records.
00000000 2
00000000 2    START_FOOTDC uses the following routines:  P_CREATE, P_DELETE,
00000000 2    M_CREATE, M_DELETE, CREATE_HEADER, CREATE_CMD_RC, CREATE_CNFG_RC,
00000000 2    CREATE_SYM_RCS, and FIND_MEAS.
00000000 2
00000000 2    Input:  1) TOTAL_MEAS, the structure containing pointers to
00000000 2               structures describing the total measurement,
00000000 2               including enables, disables, configuration, command,
00000000 2               and the measurement itself
00000000 2            2) SYMBOLS, a structure containing all the unique symbols
00000000 2               involved in the measurement
00000000 2    Output:  1) RET_CODE, the return code indicating how the starting
00000000 2                of the trace file went:
00000000 2                  -2 indicates measurement structure is corrupt
00000000 2                   0 indicates no error:  trace file started
00000000 2                   2 indicates invalid disc ( should never happen )
00000000 2                   3 indicates file not found:  invalid DCB ( should never
00000000 2                     happen )
00000000 2                   5 indicates no free pages available
00000000 2                   6 indicates no directory space available
00000000 2                   7 indicates file corrupt
00000000 2                                                                       *)
00000000 2  VAR
00000000 2
00000000 2    MSRMNT_INDEX:  S_INT; (* Index into measurement structure of
00000568 2                            measurement type record *)
00000568 2
00000568 2  BEGIN (* Procedure START_FOOTDC *)
00000568 2    (* Get rid of any previous trace file *)
00000568 2    M_DELETE ( TRC_FILE_NAME, TRC_FILE_TYPE, DISC_NO, FOOTDC_INFO.DCB,
00000568 2               RET_CODE );
0000058A 2    IF DEBUG_FLAG = DEBUG_FOOTDC
00000596 2      THEN (* Debug option on *)
00000596 2        P_DELETE ( TRC_FILE_NAME, TRC_FILE_TYPE, DISC_NO, FOOTDC_INFO.DCB,
00000596 2                   RET_CODE );
000005B8 2    (* Now, create a new one *)
000005B8 2    M_CREATE ( TRC_FILE_NAME, TRC_FILE_TYPE, DISC_NO, FOOTDC_INFO.DCB,
000005B8 2               BUFFER_SIZE, RET_CODE );
000005DE 2    IF DEBUG_FLAG = DEBUG_FOOTDC
000005EA 2      THEN (* Debug option on *)
000005EA 2        P_CREATE ( TRC_FILE_NAME, TRC_FILE_TYPE, DISC_NO, FOOTDC_INFO.DCB,
000005EA 2                   BUFFER_SIZE, RET_CODE );
00000610 2    (* Here goes the boring series of IFs *)
00000610 2    IF RET_CODE = NO_ERROR
0000061A 2      THEN (* Trace file is created *)
0000061A 2        BEGIN (* Create the header *)
0000061A 2          (* Set up FOOTDC_INFO *)
0000061A 2          FOOTDC_INFO.OPEN_FLAG := TRUE;
00000620 2          FOOTDC_INFO.UPDATE_FLAG := FALSE;
00000624 2          FOOTDC_INFO.CENTER_REC := 0;
00000628 2          FOOTDC_INFO.MIN_INDENT := 0;
0000062C 2          MSRMNT_INDEX := FIND_MEAS ( TOTAL_MEAS.MEAS_PTR^ );
00000640 2          IF MSRMNT_INDEX < 0
00000648 2            THEN (* Problems:  no measurement record found *)
00000648 2              RET_CODE := CORRUPT_USER
00000654 2            ELSE (* Found type of measurement *)
00000654 2              CREATE_HEADER ( TOTAL_MEAS.MEAS_PTR^ [ MSRMNT_INDEX ].
00000654 2                              OP_CODE, SYMBOLS.SYMBOL_COUNT, 0, RET_CODE )
00000680 2        END; (* Create the header *)
00000680 2    IF RET_CODE = NO_ERROR
0000068A 2      THEN (* Header record was created successfully *)
0000068A 2        CREATE_CMD_RC ( TOTAL_MEAS.CMD_PTR^, RET_CODE );
000006A0 2    IF RET_CODE = NO_ERROR
000006AA 2      THEN (* Command record created *)
000006AA 2        CREATE_CNFG_RC ( TOTAL_MEAS.CONFIG_PTR^, RET_CODE );
000006C0 2    IF RET_CODE = NO_ERROR
000006CA 2      THEN (* Everything up to now has worked *)
000006CA 2        CREATE_SYM_RCS ( TOTAL_MEAS.MEAS_PTR^, SYMBOLS, RET_CODE )
000006EA 2  END; (* Procedure START_FOOTDC *)
00000000 1  $GLOBPROC OFF$
00000000 1
```

```
00000000 1
00000000 1
00000000 1
00000000 1
00000000 1 (*
00000000 1                        **************************
00000000 1                        ***** FINISH_FOOTDC *****
00000000 1                        **************************
00000000 1                                                                  *)
00000000 1 $GLOBPROC ON$
00000000 1 PROCEDURE FINISH_FOOTDC ( VAR FMGR_CODE:  S_INT );
000006F2 2 (*
000006F2 2   Procedure FINISH_FOOTDC to update the header if necessary and to close
000006F2 2   the trace file.  Procedure does not do anything if the file is not
000006F2 2   open.
000006F2 2
000006F2 2   FINISH_FOOTDC uses the following routines:  UPDATE_HEADER, P_CLOSE,
000006F2 2   and M_CLOSE.
000006F2 2
000006F2 2   Input:  none - global structure FOOTDC_INFO is referenced
000006F2 2   Output:  1) FMGR_CODE, the file manager return code indicating how the
000006F2 2              finishing of the trace file went:
000006F2 2                0 indicates no error:  trace file completed
000006F2 2                1 indicates end of file ( should never happen )
000006F2 2                2 indicates invalid disc ( should never happen )
000006F2 2                3 indicates file not found:  invalid DCB ( should never
000006F2 2                  happen ) or file was never opened ( could happen )
000006F2 2                5 indicates no free pages available
000006F2 2                7 indicates file corrupt
000006F2 2                                                                  *)
000006F2 2 BEGIN (* Procedure FINISH_FOOTDC *)
000006F2 2   FMGR_CODE := 0;
000006F8 2   IF FOOTDC_INFO.OPEN_FLAG = TRUE
00000704 2     THEN (* We really need to finish it off *)
00000704 2       BEGIN (* Close out the trace file *)
00000704 2         IF FOOTDC_INFO.UPDATE_FLAG = TRUE
00000710 2           THEN (* Need to update trace file header *)
00000710 2             UPDATE_HEADER ( FMGR_CODE );
0000071C 2         IF FMGR_CODE = 0
00000726 2           THEN (* No update necessary or it went well *)
00000726 2             M_CLOSE ( FOOTDC_INFO.DCB, FMGR_CODE );
00000738 2         IF DEBUG_FLAG = DEBUG_FOOTDC
00000744 2           THEN (* Debug option on *)
00000744 2             P_CLOSE ( FOOTDC_INFO.DCB, FMGR_CODE );
00000756 2         (* Clear flag *)
00000756 2         FOOTDC_INFO.OPEN_FLAG := FALSE
0000075A 2       END (* Close out the trace file *)
0000075E 2     ELSE (* File is not opened *)
0000075E 2       FMGR_CODE := 3
00000766 2 END; (* Procedure FINISH_FOOTDC *)
00000000 1 $GLOBPROC OFF$
00000000 1 .

508: Warning: field or entry alignment; record or array comparisons may not work

End of compilation, number of errors=    0

00000000 1 "68000" PREPROCESS
00000000 1 $EXTENSIONS ON$
00000000 1 $LIB_ABS_LONG$
00000000 1 $TITLE "Soda Dynamic/Static Controller FOOTDC Utils #2"
00000000 1 PROGRAM FOOT_UTL2;
00000000 1 (*
00000000 1 ****************************** FOOT_UTL2 ******************************
00000000 1   FOOT_UTL2 is the module containing the routines for writing trace
00000000 1   records to the trace file of the Soda Dynamic and Static Controllers.
00000000 1   All routines necessary for creation of any trace records are
00000000 1   contained in this module.  See FOOT_UTL1 for creating and finishing
00000000 1   the file.  FOOT_UTL2 is processor independent.
00000000 1   Author:  Kip Fulghum
00000000 1   Date:  9-20-82  Revised:  7-30-84
00000000 1 ************************************************************************
00000000 1
```

```
00000000 1    A word to the wise:  watch your physicals and logicals!
00000000 1
00000000 1    1) ALL input addresses and PCs captured by analysis ( ie in a sextet
00000000 1    record ) are assumed to be PHYSICAL addresses and PCs.
00000000 1    2) ALL input addresses which were read from emulation memory ( ie
00000000 1    frame record stack addresses, indirect addresses and data ) are
00000000 1    assumed to be LOGICAL addresses and will be converted to physical
00000000 1    prior to being shipped out to the trace file.
00000000 1
00000000 1    FOOT_UTL2 contains the following routines:
00000000 1    -Procedure STUFF_IT packs the given data in the initial part of an
00000000 1     analysis/variable record.
00000000 1    -Procedure MOVE_INDIRECTS moves the given indirect array into the
00000000 1     given location in the given record.
00000000 1    -Global procedure WRITE_FRAME_REC writes a frame record out to the
00000000 1     trace file.
00000000 1    -Global procedure WRITE_ANLYS_REC writes an analysis record out to
00000000 1     the trace file.
00000000 1    -Global procedure WRITE_VAR_REC writes a variable analysis record out
00000000 1     to the trace file.
00000000 1    -Global procedure WRITE_MSG_REC writes a display message record out
00000000 1     to the trace file.
00000000 1    -Global procedure WRITE_TIME_REC writes a time measurement record out
00000000 1     to the trace file.
00000000 1    -Global procedure WRITE_COUNT_REC writes a count measurement record
00000000 1     out to the trace file.
00000000 1
00000000 1    In addition, FOOT_UTL2 uses the following external routines:
00000000 1    P_WRITE, M_WRITE, and P_ADDR.
00000000 1                                                                          *)
00000000 1  (*
00000000 1                          ***************************
00000000 1                          ***** Include Files *****
00000000 1                          ***************************
00000000 1                                                                          *)
00000000 1
00000000 1  #INCLUDE DEBUG_CONST:SS_DYN
00000000 1
00000000 1  #INCLUDE COM_TYPES:SS_DYN
00000000 1
00000000 1  #INCLUDE FM_TYPES:SS_DYN
00000000 1
00000000 1  #INCLUDE MSG_TYPES:SS_DYN
00000000 1
00000000 1  #INCLUDE UNLD_TYPES:SS_DYN
00000000 1
00000000 1  VAR
00000000 1
00000000 1  $EXTVAR ON$
00000000 1
00000000 1    FOOTDC_INFO:  FOOTDC_INFO_TYPE; (* Trace file information *)
00000000 1
00000000 1    DEBUG_FLAG:  S_INT; (* Flag for debug options *)
00000000 1
00000000 1    PRCSS_MSG_TBL:  MSG_TABLE; (* Dynamic/Static Process message table *)
00000000 1
00000000 1  $EXTVAR OFF$
00000000 1
00000000 1
00000000 1
00000000 1
00000000 1
00000000 1  $CALL_ABS_LONG$
00000000 1  (*
00000000 1                               ********************
00000000 1                               ***** P_WRITE *****
00000000 1                               ********************
00000000 1                                                                          *)
00000000 1  PROCEDURE P_WRITE ( VAR DCB:  DCB_TYPE; VAR RBUF:  REC_TYPE; VAR
00000000 2                      FMGR_CODE:  S_INT ); EXTERNAL;
00000000 1  (*
00000000 1    Procedure P_WRITE to interface to the Pisces file manager routine
00000000 1    WRITE.  Parameters are the same, except the error code is returned
00000000 1    as a parameter.
```

```
00000000  1                                                              *)
00000000  1
00000000  1
00000000  1
00000000  1
00000000  1
00000000  1  (*
00000000  1                               ********************
00000000  1                               ***** M_WRITE *****
00000000  1                               ********************
00000000  1                                                              *)
00000000  1  PROCEDURE M_WRITE ( VAR DCB:  DCB_TYPE; VAR RBUF:  REC_TYPE; VAR
00000000  2                      FMGR_CODE:  S_INT ); EXTERNAL;
00000000  1  (*
00000000  1    Procedure M_WRITE to "write" to the trace memory file.  Provided as
00000000  1    a Pascal external.
00000000  1                                                              *)
00000000  1
00000000  1
00000000  1
00000000  1
00000000  1
00000000  1  $CALL_PC_SHORTS
00000000  1  (*
00000000  1                               ********************
00000000  1                               ***** P_ADDR *****
00000000  1                               ********************
00000000  1                                                              *)
00000000  1  PROCEDURE P_ADDR ( LOGICAL_ADDR:  L_INT; VAR PHYSICAL_ADDR:  L_INT );
00000000  2                    EXTERNAL;
00000000  1  (*
00000000  1    Procedure P_ADDR to return the physical address equivalent of the
00000000  1    given logical address.  Provided as a Pascal external.
00000000  1                                                              *)
00000000  1
00000000  1
00000000  1
00000000  1
00000000  1
00000000  1  (*
00000000  1                               *********************
00000000  1                               ***** STUFF_IT *****
00000000  1                               *********************
00000000  1                                                              *)
00000000  1  PROCEDURE STUFF_IT ( D_TYPE, INDEX:  S_INT; M_FIELD:  L_INT; VAR
00000000  2                       SEX_REC:  SEXTET_REC_TYPE; VAR FM_REC:  REC_TYPE );
00000004  2  (*
00000004  2    Procedure STUFF_IT to pack the given data in the initial part of an
00000004  2    analysis/variable record.  Procedure packs all data common to both
00000004  2    types of records into the first part of the given record.
00000004  2
00000004  2    Input:  1) D_TYPE, the type of data
00000004  2            2) INDEX, the index into the symbol records of the
00000004  2               symbol associated with this data
00000004  2            3) M_FIELD, the multi-purpose field, usually a physical stack
00000004  2               address
00000004  2            4) SEX_REC, a record containing the unloaded hardware
00000004  2               information ( physical address and PC )
00000004  2            5) FM_REC, the file manager record into which the above data
00000004  2               is to be stuffed
00000004  2    Output:  1) FM_REC, the stuffed file manager record
00000004  2                                                              *)
00000004  2  BEGIN (* Procedure STUFF_IT *)
00000004  2    (* Set up data type and symbol index *)
00000004  2    FM_REC [ 1 ] := D_TYPE;
0000000E  2    FM_REC [ 2 ] := INDEX;
00000018  2    (* Set up address:  MSW first *)
00000018  2    FM_REC [ 3 ] := S_INT ( SHIFT ( SEX_REC.ADRS, -16 ) );
00000030  2    FM_REC [ 4 ] := S_INT ( SEX_REC.ADRS );
00000040  2    (* Set up PC value:  MSW first *)
00000040  2    FM_REC [ 5 ] := S_INT ( SHIFT ( SEX_REC.PC, -16 ) );
00000056  2    FM_REC [ 6 ] := S_INT ( SEX_REC.PC );
00000064  2    (* Put count into record *)
```

```
00000064 2    FM_REC [ 7 ] := S_INT ( SHIFT ( SEX_REC.COUNT [ 0 ], -16 ) );
0000007E 2    FM_REC [ 8 ] := S_INT ( SEX_REC.COUNT [ 0 ] );
00000090 2    FM_REC [ 9 ] := S_INT ( SHIFT ( SEX_REC.COUNT [ 1 ], -16 ) );
000000AC 2    FM_REC [ 10 ] := S_INT ( SEX_REC.COUNT [ 1 ] );
000000C0 2    (* Set data and status *)
000000C0 2    FM_REC [ 11 ] := SEX_REC.DATA;
000000CE 2    FM_REC [ 12 ] := SEX_REC.STATUS;
000000DC 2    (* Set up multi-purpose field, whatever it is *)
000000DC 2    FM_REC [ 13 ] := S_INT ( SHIFT ( M_FIELD, -16 ) );
000000F0 2    FM_REC [ 14 ] := S_INT ( M_FIELD )
000000FC 2  END; (* Procedure STUFF_IT *)
00000000 1
00000000 1
00000000 1
00000000 1
00000000 1
00000000 1  (*
00000000 1                        ***************************
00000000 1                        ***** MOVE_INDIRECTS *****
00000000 1                        ***************************
00000000 1                                                                  *)
00000000 1  PROCEDURE MOVE_INDIRECTS ( VAR INDIRECTS:  I_INFO_TYPE; OFST:  S_INT;
00000000 2                             VAR FM_REC:  REC_TYPE );
00000000 2  (*
00000000 2    Procedure MOVE_INDIRECTS to move the given offset array into the
00000000 2    given location in the given record.  All addresses and data are
00000000 2    converted to physical addresses and data as they are moved.
00000000 2
00000000 2    MOVE_INDIRECTS uses the following routine:  P_ADDR.
00000000 2
00000000 2    Input:  1) INDIRECTS, a record containing the indirect information
00000000 2               ( logical addresses and data ) and the number of levels of
00000000 2               indirection
00000000 2            2) OFST, the starting index into FM_REC to put the first word
00000000 2               of the indirect array
00000000 2            3) FM_REC, the file manager record into which the indirect
00000000 2               array is to be put, beginning with index OFST
00000000 2    Output:  1) FM_REC, the updated file manager record with the indirect
00000000 2                array put in
00000000 2                                                                  *)
00000000 2  VAR
00000000 2
00000000 2    I:  S_INT; (* WHILE loop index *)
00000002 2
00000002 2    PHYSICAL:  L_INT; (* Physical address/data *)
00000104 2
00000104 2  BEGIN (* Procedure MOVE_INDIRECTS *)
00000104 2    I := 0;
00000108 2    WHILE I < INDIRECTS.NUM DO
00000116 2      WITH INDIRECTS.LEVELS [ I ] DO
00000128 2        BEGIN (* Move the array *)
00000128 2          P_ADDR ( PTR_ADRS, PHYSICAL ); (* Convert address to physical *)
00000134 2          FM_REC [ (I*4)+OFST ] := S_INT ( SHIFT ( PHYSICAL, -16 ) );
00000156 2          FM_REC [ (I*4)+OFST+1 ] := S_INT ( PHYSICAL );
00000172 2          P_ADDR ( PTR_DATA, PHYSICAL ); (* Convert data to physical *)
00000184 2          FM_REC [ (I*4)+OFST+2 ] := S_INT ( SHIFT ( PHYSICAL, -16 ) );
000001A8 2          FM_REC [ (I*4)+OFST+3 ] := S_INT ( PHYSICAL );
000001C4 2          I := I + 1
000001C8 2        END (* Move the array *)
000001CC 2  END; (* Procedure MOVE_INDIRECTS *)
00000000 1
00000000 1
00000000 1
00000000 1
00000000 1
00000000 1  (*
00000000 1                        ***************************
00000000 1                        ***** WRITE_FRAME_REC *****
00000000 1                        ***************************
00000000 1                                                                  *)
00000000 1  $GLOBPROC ONS
00000000 1  PROCEDURE WRITE_FRAME_REC ( D_TYPE:  S_INT; VAR FRAME_INFO:
00000000 2                              FRAME_REC_TYPE; VAR REC_COUNT, FMGR_CODE:
```

```
00000000 2                          S_INT );
00000000 2
00000000 2  (*
00000000 2    Procedure WRITE_FRAME_REC to write a trace file frame record out to
00000000 2    the trace file.  Procedure takes a frame record, converts the logical
00000000 2    stack addresses to physical as it is copying them into a file manager
00000000 2    record, then ships it out to the file.
00000000 2
00000000 2    WRITE_FRAME_REC uses the following routines:  P_WRITE, M_WRITE, and
00000000 2    P_ADDR.
00000000 2
00000000 2    Input:  1) D_TYPE, the type of frame record
00000000 2            2) FRAME_INFO, the frame record ( logical stack addresses )
00000000 2            3) REC_COUNT, the previous # of data records output to trace
00000000 2               file
00000000 2    Output:  1) REC_COUNT, the updated # of data records output to trace
00000000 2                file
00000000 2             2) FMGR_CODE, the file manager return code describing how
00000000 2                things turned out:
00000000 2                  0 indicates no error:  frame record completed
00000000 2                  3 indicates file not found:  invalid DCB ( should never
00000000 2                    happen )
00000000 2                  5 indicates no free pages available
00000000 2                  7 indicates file corrupt
00000000 2                                                                      *)
00000000 2  VAR
00000000 2
00000000 2    REC_PTR:  REC_PTR_TYPE; (* Pointer to record buffer *)
00000004 2
00000004 2    I:  S_INT; (* FOR/WHILE loop counter *)
00000006 2
00000006 2    OFST:  S_INT; (* Offset into record of stack information *)
00000008 2
00000008 2    PHYSICAL:  L_INT; (* Physical stack address *)
000001D4 2
000001D4 2  BEGIN (* Procedure WRITE_FRAME_REC *)
000001D4 2    NEW ( REC_PTR ); (* Create the record for the data *)
000001E6 2    REC_PTR^ [ 0 ] := ( MAX_SEGMENTS * 2 ) + 1;
000001EE 2    REC_PTR^ [ 1 ] := D_TYPE; (* Set record type *)
000001F8 2    FOR I := 0 TO MAX_SEGMENTS - 1 DO
000001FC 2      BEGIN (* Move segment information into record *)
000001FC 2        REC_PTR^ [ (I*2)+2 ] := S_INT ( SHIFT ( FRAME_INFO.SEGMENTS [ I ],
000001FC 2                                 -16 ) );
00000226 2        REC_PTR^ [ (I*2)+3 ] := S_INT ( FRAME_INFO.SEGMENTS [ I ] )
00000248 2      END; (* Move segment information into record *)
00000258 2    OFST := ( MAX_SEGMENTS * 2 ) + 2; (* Compute offset to stack stuff *)
0000025E 2    I := 0;
00000262 2    WHILE FRAME_INFO.FRAME [ I ].SUBNO <> 0 DO
0000027A 2      WITH FRAME_INFO.FRAME [ I ] DO
0000028E 2        BEGIN (* Move frame into fmgr record *)
0000028E 2          P_ADDR ( STACK_ADRS, PHYSICAL ); (* Convert stack to physical *)
0000029C 2          REC_PTR^ [ 0 ] := REC_PTR^ [ 0 ] + 3; (* Increment rec size *)
000002A6 2          REC_PTR^ [ (I*3)+OFST ] := SUBNO;
000002BC 2          REC_PTR^ [ (I*3)+OFST+1 ] := S_INT ( SHIFT ( PHYSICAL, -16 ) );
000002E0 2          REC_PTR^ [ (I*3)+OFST+2 ] := S_INT ( PHYSICAL );
000002FC 2          I := I + 1
00000300 2        END; (* Move frame into fmgr record *)
00000304 2    M_WRITE ( FOOTDC_INFO.DCB, REC_PTR^, FMGR_CODE ); (* Write rec out *)
00000320 2    IF DEBUG_FLAG = DEBUG_FOOTDC
0000032C 2      THEN (* Debug option on *)
0000032C 2        P_WRITE ( FOOTDC_INFO.DCB, REC_PTR^, FMGR_CODE );
00000348 2    REC_COUNT := REC_COUNT + 1;
00000352 2    DISPOSE ( REC_PTR ) (* Return record to heap *)
00000364 2  END; (* Procedure WRITE_FRAME_REC *)
00000000 1  $GLOBPROC OFF$
00000000 1
00000000 1
00000000 1
00000000 1
00000000 1
```

```
00000000 1 (*
00000000 1                      ****************************
00000000 1                      ***** WRITE_ANLYS_REC *****
00000000 1                      ****************************
00000000 1                                                                   *)
00000000 1 $GLOBPROC ON$
00000000 1 PROCEDURE WRITE_ANLYS_REC ( D_TYPE, INDEX:  S_INT; M_FIELD:  L_INT; VAR
00000000 2                           SEX_REC:  SEXTET_REC_TYPE; VAR REC_COUNT,
00000000 2                           FMGR_CODE:  S_INT );
00000000 2 (*
00000000 2   Procedure WRITE_ANLYS_REC to write an analysis record out to the
00000000 2   trace file.  Procedure simply plugs the given values into appropriate
00000000 2   fields of the record, then writes the record out to the file.
00000000 2
00000000 2   WRITE_ANLYS_REC uses the following routines:  P_WRITE, M_WRITE, and
00000000 2   STUFF_IT.
00000000 2
00000000 2   Input:  1) D_TYPE, the type of data
00000000 2           2) INDEX, the index into the symbol records of the
00000000 2              symbol associated with this data
00000000 2           3) M_FIELD, the multi-purpose field, usually a physical stack
00000000 2              address
00000000 2           4) SEX_REC, a record containing the unloaded hardware
00000000 2              information ( physical address and PC )
00000000 2           5) REC_COUNT, the previous # of data records output to trace
00000000 2              file
00000000 2   Output:  1) REC_COUNT, the updated # of data records output to trace
00000000 2               file
00000000 2            2) FMGR_CODE, the return code indicating how things turned
00000000 2               out:
00000000 2                 0 indicates no error:  data record completed
00000000 2                 3 indicates file not found:  invalid DCB ( should never
00000000 2                   happen )
00000000 2                 5 indicates no free pages available
00000000 2                 7 indicates file corrupt
00000000 2                                                                    *)
00000000 2 VAR
00000000 2
00000000 2   REC_PTR:  REC_PTR_TYPE; (* Pointer to record buffer *)
0000036C 2
0000036C 2 BEGIN (* Procedure WRITE_ANLYS_REC *)
0000036C 2   NEW ( REC_PTR ); (* Create the record for the data *)
0000037E 2   REC_PTR^ [ 0 ] := 14; (* Set record length *)
00000386 2   (* Stuff the record *)
00000386 2   STUFF_IT ( D_TYPE, INDEX, M_FIELD, SEX_REC, REC_PTR^ );
000003A8 2   (* Get the record out to the file *)
000003A8 2   M_WRITE ( FOOTDC_INFO.DCB, REC_PTR^, FMGR_CODE );
000003C4 2   IF DEBUG_FLAG = DEBUG_FOOTDC
000003D0 2     THEN (* Debug option on *)
000003D0 2       P_WRITE ( FOOTDC_INFO.DCB, REC_PTR^, FMGR_CODE );
000003EC 2   REC_COUNT := REC_COUNT + 1;
000003F6 2   DISPOSE ( REC_PTR ) (* Return it to the heap *)
00000408 2 END; (* Procedure WRITE_ANLYS_REC *)
00000000 1 $GLOBPROC OFF$
00000000 1
00000000 1
00000000 1
00000000 1
00000000 1
00000000 1 (*
00000000 1                        **************************
00000000 1                        ***** WRITE_VAR_REC *****
00000000 1                        **************************
00000000 1                                                                    *)
00000000 1 $GLOBPROC ON$
00000000 1 PROCEDURE WRITE_VAR_REC ( D_TYPE, INDEX:  S_INT; M_FIELD:  L_INT; VAR
00000000 2                         SEX_REC:  SEXTET_REC_TYPE; VAR TWIN_INDIRECTS:
00000000 2                         TWIN_I_TYPE; VAR REC_COUNT, FMGR_CODE:
00000000 2                         S_INT );
00000000 2 (*
00000000 2   Procedure WRITE_VAR_REC to write a variable analysis record out to the
00000000 2   trace file.  Procedure simply plugs the given values into appropriate
00000000 2   fields of the record, then writes the record out to the file.
00000000 2
```

```
00000000  2     WRITE_VAR_REC uses the following routines:  P_WRITE, M_WRITE,
00000000  2     STUFF_IT, and MOVE_INDIRECTS.
00000000  2
00000000  2     Input:  1) D_TYPE, the type of data
00000000  2             2) INDEX, the index into the symbol records of the
00000000  2                symbol associated with this data
00000000  2             3) M_FIELD, the multi-purpose field, usually a physical stack
00000000  2                address
00000000  2             4) SEX_REC, a record containing the unloaded hardware
00000000  2                information ( physical address and PC )
00000000  2             5) TWIN_INDIRECTS, a record containing the indirect
00000000  2                information for the variable(s) ( logical addresses and
00000000  2                data )
00000000  2             6) REC_COUNT, the previous # of data records output to trace
00000000  2                file
00000000  2     Output:  1) REC_COUNT, the updated # of data records output to trace
00000000  2                 file
00000000  2              2) FMGR_CODE, the return code indicating how things turned
00000000  2                 out:
00000000  2                   0 indicates no error:  data record completed
00000000  2                   3 indicates file not found:  invalid DCB ( should never
00000000  2                     happen )
00000000  2                   5 indicates no free pages available
00000000  2                   7 indicates file corrupt
00000000  2                                                                        *)
00000000  2  VAR
00000000  2
00000000  2    REC_PTR:  REC_PTR_TYPE; (* Pointer to record buffer *)
00000004  2
00000004  2    HI_COUNT:  S_INT; (* # levels of indirection for upper symbol *)
00000006  2
00000006  2    LO_COUNT:  S_INT; (* # levels of indirection for lower symbol *)
00000410  2
00000410  2  BEGIN (* Procedure WRITE_VAR_REC *)
00000410  2    NEW ( REC_PTR ); (* Create the record for the data *)
00000422  2    REC_PTR^ [ 0 ] := 15; (* Set record length *)
0000042A  2    (* Stuff the record *)
0000042A  2    STUFF_IT ( D_TYPE, INDEX, M_FIELD, SEX_REC, REC_PTR^ );
0000044C  2    (* Now, put in indirect information *)
0000044C  2    IF TWIN_INDIRECTS.HI_I <> NIL
00000456  2      THEN (* This array needs to be moved *)
00000456  2        BEGIN (* Move upper array *)
00000456  2          HI_COUNT := TWIN_INDIRECTS.HI_I^.NUM;
00000460  2          MOVE_INDIRECTS ( TWIN_INDIRECTS.HI_I^, 16, REC_PTR^ );
0000047C  2          REC_PTR^ [ 0 ] := REC_PTR^ [ 0 ] + ( 4 * HI_COUNT )
0000048E  2        END  (* Move upper array *)
00000492  2      ELSE (* No upper array *)
00000492  2        HI_COUNT := 0;
00000496  2    IF TWIN_INDIRECTS.LO_I <> NIL
000004A2  2      THEN (* This array needs to be moved *)
000004A2  2        IF ( TWIN_INDIRECTS.LO_I^.NUM <> 0 ) AND
000004A2  2           ( TWIN_INDIRECTS.HI_I = TWIN_INDIRECTS.LO_I )
000004C4  2          THEN (* Arrays are the same *)
000004C4  2            LO_COUNT := 00FFH
000004CE  2          ELSE (* Arrays are different *)
000004CE  2            BEGIN (* Move lower array *)
000004CE  2              LO_COUNT := TWIN_INDIRECTS.LO_I^.NUM;
000004DA  2              MOVE_INDIRECTS ( TWIN_INDIRECTS.LO_I^, 16+(HI_COUNT*4),
000004DA  2                               REC_PTR^ );
000004FE  2              REC_PTR^ [ 0 ] := REC_PTR^ [ 0 ] + ( 4 * LO_COUNT )
00000510  2            END (* Move lower array *)
00000514  2      ELSE (* No lower array *)
00000514  2        LO_COUNT := 0;
00000518  2    (* Set levels of indirection *)
00000518  2    REC_PTR^ [ 15 ] := SHIFT ( HI_COUNT, 8 ) + SHIFT ( SHIFT ( LO_COUNT,
00000518  2                       8 ), -8 );
00000530  2    (* Get the record out to the file *)
00000530  2    M_WRITE ( FOOTDC_INFO.DCB, REC_PTR^, FMGR_CODE );
0000054C  2    IF DEBUG_FLAG = DEBUG_FOOTDC
00000558  2      THEN (* Debug option on *)
00000558  2        P_WRITE ( FOOTDC_INFO.DCB, REC_PTR^, FMGR_CODE );
00000574  2    REC_COUNT := REC_COUNT + 1;
0000057E  2    DISPOSE ( REC_PTR ) (* Return it to the heap *)
00000590  2  END; (* Procedure WRITE_VAR_REC *)
00000000  1  $GLOBPROC OFF$
```

```
00000000  1
00000000  1
00000000  1
00000000  1
00000000  1
00000000  1  (*
00000000  1                       **************************
00000000  1                       ***** WRITE_MSG_REC *****
00000000  1                       **************************
00000000  1                                                                        *)
00000000  1  $GLOBPROC ON$
00000000  1  PROCEDURE WRITE_MSG_REC ( D_TYPE, MSG_NO:  S_INT; VAR REC_COUNT,
00000000  2                          FMGR_CODE:  S_INT );
00000000  2  (*
00000000  2    Procedure WRITE_MSG_REC to write a display message record out to the
00000000  2    trace file.  Procedure copies the given message into a record, then
00000000  2    writes it out to the trace file.
00000000  2
00000000  2    WRITE_MSG_REC uses the following routines:  P_WRITE and M_WRITE.
00000000  2
00000000  2    Input:  1) D_TYPE, the type of data
00000000  2            2) MSG_NO, the # of the message ( in the message table ) to
00000000  2               be written to the trace file
00000000  2            3) REC_COUNT, the previous # of data records output to trace
00000000  2               file
00000000  2    Output:  1) REC_COUNT, the updated # of data records output to trace
00000000  2                file
00000000  2             2) FMGR_CODE, the return code indicating how things turned
00000000  2                out:
00000000  2                  0 indicates no error:  msg record completed
00000000  2                  3 indicates file not found:  invalid DCB ( should never
00000000  2                    happen )
00000000  2                  5 indicates no free pages available
00000000  2                  7 indicates file corrupt
00000000  2                                                                        *)
00000000  2  VAR
00000000  2
00000000  2    REC_PTR:  REC_PTR_TYPE; (* Pointer to record buffer *)
00000004  2
00000004  2    I:  S_INT; (* FOR loop index *)
00000598  2
00000598  2  BEGIN (* Procedure WRITE_MSG_REC *)
00000598  2    NEW ( REC_PTR ); (* Create the record for the data *)
000005AA  2    REC_PTR^ [ 0 ] := PRCSS_MSG_TBL [ MSG_NO ]^.LENGTH + 1; (* Length *)
000005C6  2    (* Create the record *)
000005C6  2    REC_PTR^ [ 1 ] := D_TYPE;
000005CC  2    WITH PRCSS_MSG_TBL [ MSG_NO ]^ DO
000005E0  2      FOR I := 1 TO LENGTH DO
000005F8  2        REC_PTR^ [ I+1 ] := TEXT [ I ];
0000062C  2    (* Get the record out to the file *)
0000062C  2    M_WRITE ( FOOTDC_INFO.DCB, REC_PTR^, FMGR_CODE );
00000648  2    IF DEBUG_FLAG = DEBUG_FOOTDC
00000654  2      THEN (* Debug option on *)
00000654  2        P_WRITE ( FOOTDC_INFO.DCB, REC_PTR^, FMGR_CODE );
00000670  2    REC_COUNT := REC_COUNT + 1;
0000067A  2    DISPOSE ( REC_PTR ) (* Return it to the heap *)
0000068C  2  END; (* Procedure WRITE_MSG_REC *)
00000000  1  $GLOBPROC OFF$
00000000  1
00000000  1
00000000  1
00000000  1
00000000  1
00000000  1  (*
00000000  1                       **************************
00000000  1                       ***** WRITE_TIME_REC *****
00000000  1                       **************************
00000000  1                                                                        *)
00000000  1  $GLOBPROC ON$
00000000  1  PROCEDURE WRITE_TIME_REC ( D_TYPE, INDEX:  S_INT; VAR TIME_REC:
00000000  2                          TIME_REC_TYPE; VAR REC_COUNT, FMGR_CODE:
00000000  2                          S_INT );
```

```
00000000  2  (*
00000000  2    Procedure WRITE_TIME_REC to write a time measurement record out to
00000000  2    the trace file.  Procedure simply plugs the given values into
00000000  2    appropriate fields of the record, then writes the record out to
00000000  2    the file.
00000000  2
00000000  2    WRITE_TIME_REC uses the following routines:  P_WRITE and M_WRITE.
00000000  2
00000000  2    Input:  1) D_TYPE, the type of data
00000000  2            2) INDEX, the index into the symbol records of the
00000000  2               symbol associated with this data
00000000  2            3) TIME_REC, a record containing the timing information, ie
00000000  2               # of samples, minimum, maximum, and average
00000000  2            4) REC_COUNT, the previous # of data records output to trace
00000000  2               file
00000000  2    Output:  1) REC_COUNT, the updated # of data records output to trace
00000000  2                file
00000000  2             2) FMGR_CODE, the return code indicating how things turned
00000000  2                out:
00000000  2                  0 indicates no error:  data record completed
00000000  2                  3 indicates file not found:  invalid DCB ( should never
00000000  2                    happen )
00000000  2                  5 indicates no free pages available
00000000  2                  7 indicates file corrupt
00000000  2                                                                      *)
00000000  2  VAR
00000000  2
00000000  2    REC_PTR:  REC_PTR_TYPE; (* Pointer to record buffer *)
00000694  2
00000694  2  BEGIN (* Procedure WRITE_TIME_REC *)
00000694  2    NEW ( REC_PTR ); (* Create the record for the data *)
000006A6  2    REC_PTR^ [ 0 ] := 15; (* Set record length *)
000006AE  2    (* Set up data type and symbol index *)
000006AE  2    REC_PTR^ [ 1 ] := D_TYPE;
000006B8  2    REC_PTR^ [ 2 ] := INDEX;
000006C2  2    (* Set up number of samples *)
000006C2  2    REC_PTR^ [ 3 ] := TIME_REC.NUM_SAMPLES;
000006CE  2    (* Move minimum time information *)
000006CE  2    REC_PTR^ [ 4 ] := S_INT ( SHIFT ( TIME_REC.MIN_TIME [ 0 ], -16 ) );
000006E8  2    REC_PTR^ [ 5 ] := S_INT ( TIME_REC.MIN_TIME [ 0 ] );
000006FA  2    REC_PTR^ [ 6 ] := S_INT ( SHIFT ( TIME_REC.MIN_TIME [ 1 ], -16 ) );
00000716  2    REC_PTR^ [ 7 ] := S_INT ( TIME_REC.MIN_TIME [ 1 ] );
0000072A  2    (* Move maximum time information *)
0000072A  2    REC_PTR^ [ 8 ] := S_INT ( SHIFT ( TIME_REC.MAX_TIME [ 0 ], -16 ) );
00000744  2    REC_PTR^ [ 9 ] := S_INT ( TIME_REC.MAX_TIME [ 0 ] );
00000756  2    REC_PTR^ [ 10 ] := S_INT ( SHIFT ( TIME_REC.MAX_TIME [ 1 ], -16 ) );
00000772  2    REC_PTR^ [ 11 ] := S_INT ( TIME_REC.MAX_TIME [ 1 ] );
00000786  2    (* Move average time information *)
00000786  2    REC_PTR^ [ 12 ] := S_INT ( SHIFT ( TIME_REC.AVG_TIME [ 0 ], -16 ) );
000007A0  2    REC_PTR^ [ 13 ] := S_INT ( TIME_REC.AVG_TIME [ 0 ] );
000007B2  2    REC_PTR^ [ 14 ] := S_INT ( SHIFT ( TIME_REC.AVG_TIME [ 1 ], -16 ) );
000007CE  2    REC_PTR^ [ 15 ] := S_INT ( TIME_REC.AVG_TIME [ 1 ] );
000007E2  2    (* Get the record out to the file *)
000007E2  2    M_WRITE ( FOOTDC_INFO.DCB, REC_PTR^, FMGR_CODE );
000007FE  2    IF DEBUG_FLAG = DEBUG_FOOTDC
0000080A  2      THEN (* Debug option on *)
0000080A  2        P_WRITE ( FOOTDC_INFO.DCB, REC_PTR^, FMGR_CODE );
00000826  2    REC_COUNT := REC_COUNT + 1;
00000830  2    DISPOSE ( REC_PTR ) (* Return it to the heap *)
00000842  2  END; (* Procedure WRITE_TIME_REC *)
00000000  1  $GLOBPROC OFF$
00000000  1
00000000  1
00000000  1
00000000  1
00000000  1
00000000  1  (*
00000000  1                      ****************************
00000000  1                      ***** WRITE_COUNT_REC *****
00000000  1                      ****************************
00000000  1                                                                      *)
00000000  1  $GLOBPROC ON$
00000000  1  PROCEDURE WRITE_COUNT_REC ( D_TYPE, LINE:  S_INT; VAR COUNT:
00000000  2                              DOUBLE_ARRAY; VAR REC_COUNT, FMGR_CODE:
00000000  2                              S_INT );
```

```
00000000 2 (*
00000000 2   Procedure WRITE_COUNT_REC to write a count measurement record out
00000000 2   to the trace file.  Procedure simply plugs the given values into
00000000 2   appropriate fields of the record, then writes the record out to
00000000 2   the file.
00000000 2
00000000 2   WRITE_COUNT_REC uses the following routines:  P_WRITE and M_WRITE.
00000000 2
00000000 2   Input:  1) D_TYPE, the type of data
00000000 2           2) LINE, the line being counted
00000000 2           3) COUNT, the count associated with the line
00000000 2           4) REC_COUNT, the previous # of data records output to trace
00000000 2              file
00000000 2   Output:  1) REC_COUNT, the updated # of data records output to trace
00000000 2               file
00000000 2            2) FMGR_CODE, the return code indicating how things turned
00000000 2               out:
00000000 2                 0 indicates no error:  data record completed
00000000 2                 3 indicates file not found:  invalid DCB ( should never
00000000 2                   happen )
00000000 2                 5 indicates no free pages available
00000000 2                 7 indicates file corrupt
00000000 2                                                                     *)
00000000 2 VAR
00000000 2
00000000 2   REC_PTR:  REC_PTR_TYPE; (* Pointer to record buffer *)
0000084A 2
0000084A 2 BEGIN (* Procedure WRITE_COUNT_REC *)
0000084A 2   NEW ( REC_PTR ); (* Create the record for the data *)
0000085C 2   REC_PTR^ [ 0 ] := 6; (* Set record length *)
00000864 2   (* Set up data type *)
00000864 2   REC_PTR^ [ 1 ] := D_TYPE;
0000086E 2   (* Set up line # *)
0000086E 2   REC_PTR^ [ 2 ] := LINE;
00000878 2   (* Move count information *)
00000878 2   REC_PTR^ [ 3 ] := S_INT ( SHIFT ( COUNT [ 0 ], -16 ) );
0000088E 2   REC_PTR^ [ 4 ] := S_INT ( COUNT [ 0 ] );
0000089C 2   REC_PTR^ [ 5 ] := S_INT ( SHIFT ( COUNT [ 1 ], -16 ) );
000008B4 2   REC_PTR^ [ 6 ] := S_INT ( COUNT [ 1 ] );
000008C4 2   (* Get the record out to the file *)
000008C4 2   M_WRITE ( FOOTDC_INFO.DCB, REC_PTR^, FMGR_CODE );
000008E0 2   IF DEBUG_FLAG = DEBUG_FOOTDC
000008EC 2     THEN (* Debug option on *)
000008EC 2       P_WRITE ( FOOTDC_INFO.DCB, REC_PTR^, FMGR_CODE );
00000908 2   REC_COUNT := REC_COUNT + 1;
00000912 2   DISPOSE ( REC_PTR ) (* Return it to the heap *)
00000924 2 END; (* Procedure WRITE_COUNT_REC *)
00000000 1 $GLOBPROC OFF$
00000000 1 .

598: Warning: field or entry alignment; record or array comparisons may not work

End of compilation, number of errors=    0
00000000 1 "68000" PREPROCESS
00000000 1 $EXTENSIONS ON$
00000000 1 $TITLE "Soda Dynamic Controller Run Utilities"
00000000 1 PROGRAM RUN_UTLS;
00000000 1 (*
00000000 1 ******************************** RUN_UTLS ********************************
00000000 1   RUN_UTLS is the module containing all the run/monitor/halt hardware
00000000 1   support routines necessary for the dynamic controller.  These
00000000 1   routines should supply the enough support for controlling the
00000000 1   hardware set.  RUN_UTLS is processor independent.
00000000 1   Author:  Kip Fulghum
00000000 1   Date:  3-9-83  Revised:  10-1-84
00000000 1 **************************************************************************
00000000 1
00000000 1   RUN_UTLS contains the following routines:
00000000 1   -Global procedure RUN_HW starts the hardware running.
00000000 1   -Global procedure MONITOR_HW reads all current hardware flags.
00000000 1   -Global procedure HALT_HW halts a hardware run and reads all required
00000000 1    hardware flags.
00000000 1
```

```
00000000 1    In addition, the following external procedures and functions are
00000000 1    used:  FLUSH_LAST_CNT, SET_BITS, CLEAR_BITS, TEST_BITS, READ_MAC,
00000000 1    WRITE_CNTRL_WRD, and READ_FLAG_WRD.
00000000 1                                                                     *)
00000000 1  (*
00000000 1                        ***************************
00000000 1                        ***** Include Files *****
00000000 1                        ***************************
00000000 1                                                                     *)
00000000 1  #INCLUDE CMD_CONST:SS_DYN
00000000 1
00000000 1  #INCLUDE COM_TYPES:SS_DYN
00000000 1
00000000 1
00000000 1
00000000 1
00000000 1
00000000 1  (*
00000000 1                        ****************************
00000000 1                        ***** FLUSH_LAST_CNT *****
00000000 1                        ****************************
00000000 1                                                                     *)
00000000 1  PROCEDURE FLUSH_LAST_CNT ( CUR_CNTRL_2:  L_INT ); EXTERNAL;
00000000 1  (*
00000000 1    Procedure FLUSH_LAST_CNT to flush the last time/state count out of
00000000 1    the pipeline register into acquisition memory.  Provided as an
00000000 1    assembly language external.
00000000 1                                                                     *)
00000000 1
00000000 1
00000000 1
00000000 1
00000000 1
00000000 1
00000000 1  (*
00000000 1                          **********************
00000000 1                          ***** SET_BITS *****
00000000 1                          **********************
00000000 1                                                                     *)
00000000 1  PROCEDURE SET_BITS ( BIT_WORD:  L_INT; VAR SET_WORD:  L_INT ); EXTERNAL;
00000000 1  (*
00000000 1    Procedure SET_BITS to set the bits indicated in BIT_WORD in SET_WORD,
00000000 1    ie "OR" BIT_WORD with SET_WORD.  Provided as an assembly language
00000000 1    external.
00000000 1                                                                     *)
00000000 1
00000000 1
00000000 1
00000000 1
00000000 1
00000000 1
00000000 1  (*
00000000 1                          ************************
00000000 1                          ***** CLEAR_BITS *****
00000000 1                          ************************
00000000 1                                                                     *)
00000000 1  PROCEDURE CLEAR_BITS ( BIT_WORD:  L_INT; VAR CLEAR_WORD:  L_INT );
00000000 2                         EXTERNAL;
00000000 1  (*
00000000 1    Procedure CLEAR_BITS to clear the bits indicated in BIT_WORD in
00000000 1    CLEAR_WORD, ie "NOT" BIT_WORD, then "AND" with CLEAR_WORD.  Provided
00000000 1    as an assembly language external.
00000000 1                                                                     *)
00000000 1
00000000 1
00000000 1
00000000 1
00000000 1
00000000 1
00000000 1  (*
00000000 1                          ***********************
00000000 1                          ***** TEST_BITS *****
00000000 1                          ***********************
00000000 1                                                                     *)
00000000 1  FUNCTION TEST_BITS ( BIT_WORD, TEST_WORD:  L_INT ):  BOOLEAN; EXTERNAL;
00000000 1  (*
```

```
00000000  1    Function TEST_BITS to see if all of the bits indicated in BIT_WORD
00000000  1    are set in TEST_WORD, ie "AND" both words and see if the result is
00000000  1    equal to BIT_WORD.  Provided as an assembly language external.
00000000  1                                                                      *)
00000000  1
00000000  1
00000000  1
00000000  1
00000000  1
00000000  1  (*
00000000  1                             ********************
00000000  1                             ***** READ_MAC *****
00000000  1                             ********************
00000000  1                                                                      *)
00000000  1  FUNCTION READ_MAC:  S_INT; EXTERNAL;
00000000  1  (*
00000000  1    Function READ_MAC to read the current value of the memory address
00000000  1    counter.  Provided as an assembly language external.
00000000  1                                                                      *)
00000000  1
00000000  1
00000000  1
00000000  1
00000000  1
00000000  1  (*
00000000  1                          ****************************
00000000  1                          ***** WRITE_CNTRL_WRD *****
00000000  1                          ****************************
00000000  1                                                                      *)
00000000  1  PROCEDURE WRITE_CNTRL_WRD ( TYPE_WORD:  CNTRLLR_TYPES; CONTROL_VALUE:
00000000  2                                L_INT ); EXTERNAL;
00000000  1  (*
00000000  1    Procedure WRITE_CNTRL_WRD to write the indicated control word out to
00000000  1    its designated location in memory.  Provided as a Pascal external.
00000000  1                                                                      *)
00000000  1
00000000  1
00000000  1
00000000  1
00000000  1
00000000  1  (*
00000000  1                           **************************
00000000  1                           ***** READ_FLAG_WRD *****
00000000  1                           **************************
00000000  1                                                                      *)
00000000  1  PROCEDURE READ_FLAG_WRD ( TYPE_WORD:  FLAG_TYPES; VAR FLAG_VALUE:
00000000  2                              S_INT ); EXTERNAL;
00000000  1  (*
00000000  1    Procedure READ_FLAG_WRD to read the indicated system flag word out
00000000  1    of its designated location in memory.  Provided as a Pascal external.
00000000  1                                                                      *)
00000000  1
00000000  1
00000000  1
00000000  1
00000000  1
00000000  1  (*
00000000  1                              ******************
00000000  1                              ***** RUN_HW *****
00000000  1                              ******************
00000000  1                                                                      *)
00000000  1  $GLOBPROC ON$
00000000  1  PROCEDURE RUN_HW ( VAR CNTRL_ARRAY:  CNTRL_ARRAY_TYPE );
00000004  2  (*
00000004  2    Procedure RUN_HW to start the hardware running.  Procedure sets/
00000004  2    clears the necessary bits in the required control words to put the
00000004  2    hardware in measurement mode, then starts the hardware.  The
00000004  2    hardware is then left in measurement mode.
00000004  2
00000004  2    RUN_HW uses the following routines:  SET_BITS, CLEAR_BITS, and
00000004  2    WRITE_CNTRL_WRD.
00000004  2
00000004  2    Input:  1) CNTRL_ARRAY, the control word data structure containing
00000004  2               copies of the current control words
```

```
00000004  2    Output:  1) CNTRL_ARRAY, the updated control word data structure
00000004  2                                                                                  *)
00000004  2  BEGIN (* Procedure RUN_HW *)
00000004  2    (* Put micro-code occurance counters in measurement mode *)
00000004  2    CNTRL_ARRAY [ ACQ_BYTE ] := CNT_MEAS_MODE;
00000010  2    WRITE_CNTRL_WRD ( ACQ_BYTE, CNTRL_ARRAY [ ACQ_BYTE ] );
00000022  2    (* Put memory in measurement mode *)
00000022  2    SET_BITS ( MEM_MEAS_MODE, CNTRL_ARRAY [ CONTROL_BYTE ] );
00000036  2    WRITE_CNTRL_WRD ( CONTROL_BYTE, CNTRL_ARRAY [ CONTROL_BYTE ] );
00000048  2    (* Reset control board *)
00000048  2    WRITE_CNTRL_WRD ( CONTROL_RESET, CNTRL_ARRAY [ CONTROL_RESET ] );
0000005A  2    (* Set function generators/fast sequencer mode to measurement *)
0000005A  2    SET_BITS ( GEN_FSR_MEAS_MD, CNTRL_ARRAY [ CONTROL_2 ] );
0000006E  2    WRITE_CNTRL_WRD ( CONTROL_2, CNTRL_ARRAY [ CONTROL_2 ] );
00000080  2    (* Switch to measurement mode *)
00000080  2    CLEAR_BITS ( TRANS_MODE, CNTRL_ARRAY [ CONTROL_2 ] );
00000094  2    WRITE_CNTRL_WRD ( CONTROL_2, CNTRL_ARRAY [ CONTROL_2 ] );
000000A6  2    SET_BITS ( MEAS_MODE, CNTRL_ARRAY [ CONTROL_2 ] );
000000BA  2    WRITE_CNTRL_WRD ( CONTROL_2, CNTRL_ARRAY [ CONTROL_2 ] );
000000CC  2    (* Clear forced halt *)
000000CC  2    SET_BITS ( NORM_RUN, CNTRL_ARRAY [ CONTROL_2 ] );
000000E0  2    WRITE_CNTRL_WRD ( CONTROL_2, CNTRL_ARRAY [ CONTROL_2 ] );
000000F2  2    (* Set synchronous run command *)
000000F2  2    SET_BITS ( SYNC_RUN, CNTRL_ARRAY [ CONTROL_2 ] );
00000106  2    WRITE_CNTRL_WRD ( CONTROL_2, CNTRL_ARRAY [ CONTROL_2 ] );
00000118  2    (* Make sure we're not holding IMB up *)
00000118  2    CLEAR_BITS ( HOLD_LNE, CNTRL_ARRAY [ CONTROL_1 ] );
0000012A  2    WRITE_CNTRL_WRD ( CONTROL_1, CNTRL_ARRAY [ CONTROL_1 ] )
0000013C  2  END; (* Procedure RUN_HW *)
00000000  1  $GLOBPROC OFF$
00000000  1
00000000  1
00000000  1
00000000  1
00000000  1
00000000  1  (*
00000000  1                            *********************
00000000  1                            ***** MONITOR_HW *****
00000000  1                            *********************
00000000  1                                                                                  *)
00000000  1  $GLOBPROC ON$
00000000  1  PROCEDURE MONITOR_HW ( VAR FLG_ARRAY:  FLAG_ARRAY_TYPE; VAR MAC:
00000000  2                            S_INT );
00000140  2  (*
00000140  2    Procedure MONITOR_HW to read all current hardware flags.  Procedure
00000140  2    reads all status flags, as well as the memory address counter,
00000140  2    necessary to provide adequate information during a run.
00000140  2
00000140  2    MONITOR_HW uses the following routines:  READ_MAC and READ_FLAG_WRD.
00000140  2
00000140  2    Input:  none
00000140  2    Output:  1) FLG_ARRAY, an array containing copies of the read
00000140  2                hardware flag words
00000140  2             2) MAC, the memory address counter
00000140  2                                                                                  *)
00000140  2  BEGIN (* Procedure MONITOR_HW *)
00000140  2    (* Read memory address counter *)
00000140  2    MAC := READ_MAC;
0000014A  2    (* Read all flag words AFTER the memory address counter *)
0000014A  2    READ_FLAG_WRD ( FLAG_1, FLG_ARRAY [ FLAG_1 ] );
00000158  2    READ_FLAG_WRD ( FLAG_2, FLG_ARRAY [ FLAG_2 ] );
0000016A  2    READ_FLAG_WRD ( FLAG_3, FLG_ARRAY [ FLAG_3 ] )
0000017C  2  END; (* Procedure MONITOR_HW *)
00000000  1  $GLOBPROC OFF$
00000000  1
00000000  1
00000000  1
00000000  1
00000000  1
00000000  1  (*
00000000  1                            ******************
00000000  1                            ***** HALT_HW *****
00000000  1                            ******************
00000000  1                                                                                  *)
```

```
00000000 1  $GLOBPROC ONS
00000000 1  PROCEDURE HALT_HW ( VAR CNTRL_ARRAY:  CNTRL_ARRAY_TYPE; VAR FLG_ARRAY:
00000000 2                       FLAG_ARRAY_TYPE; VAR MAC:  S_INT );
00000184 2  (*
00000184 2    Procedure HALT_HW to halt the hardware:  stop a run.   Procedure sets/
00000184 2    clears the necessary bits in the required control words to put the
00000184 2    hardware in a halted mode.  After all hardware flags and the memory
00000184 2    address counter are read, the hardware is put in load mode.
00000184 2
00000184 2    HALT_HW uses the following routines:  FLUSH_LAST_CNT, SET_BITS,
00000184 2    CLEAR_BITS, TEST_BITS, READ_MAC, WRITE_CNTRL_WRD, and READ_FLAG_WRD.
00000184 2
00000184 2    Input:  1) CNTRL_ARRAY, the control word data structure containing
00000184 2               copies of the current control words
00000184 2    Output:  1) CNTRL_ARRAY, the updated control word data structure
00000184 2             2) FLG_ARRAY, an array containing copies of the read
00000184 2                hardware flag words
00000184 2             3) MAC, the memory address counter
00000184 2                                                                      *)
00000184 2  BEGIN (* Procedure HALT_HW *)
00000184 2    (* Send synchronous halt command *)
00000184 2    CLEAR_BITS ( SYNC_RUN, CNTRL_ARRAY [ CONTROL_2 ] );
00000198 2    WRITE_CNTRL_WRD ( CONTROL_2, CNTRL_ARRAY [ CONTROL_2 ] );
000001AA 2    (* Assert forced halt *)
000001AA 2    CLEAR_BITS ( NORM_RUN, CNTRL_ARRAY [ CONTROL_2 ] );
000001BE 2    WRITE_CNTRL_WRD ( CONTROL_2, CNTRL_ARRAY [ CONTROL_2 ] );
000001D0 2    (* Halt the micro-code occurance counters *)
000001D0 2    CNTRL_ARRAY [ ACQ_BYTE ] := CNT_UNLD_MODE;
000001DC 2    WRITE_CNTRL_WRD ( ACQ_BYTE, CNTRL_ARRAY [ ACQ_BYTE ] );
000001EE 2    (* Read all flag words BEFORE putting hw in load/unload mode *)
000001EE 2    READ_FLAG_WRD ( FLAG_1, FLG_ARRAY [ FLAG_1 ] );
000001FC 2    READ_FLAG_WRD ( FLAG_2, FLG_ARRAY [ FLAG_2 ] );
0000020E 2    READ_FLAG_WRD ( FLAG_3, FLG_ARRAY [ FLAG_3 ] );
00000220 2    (* Read memory address counter *)
00000220 2    MAC := READ_MAC;
0000022A 2    (* Flush last count if not pointing to first state *)
0000022A 2    IF MAC <> 1
00000238 2      THEN (* Want to flush last count out *)
00000238 2        FLUSH_LAST_CNT ( CNTRL_ARRAY [ CONTROL_2 ] );
00000246 2    (* Switch to load/unload mode *)
00000246 2    CLEAR_BITS ( TRANS_MODE, CNTRL_ARRAY [ CONTROL_2 ] );
0000025A 2    WRITE_CNTRL_WRD ( CONTROL_2, CNTRL_ARRAY [ CONTROL_2 ] );
0000026C 2    SET_BITS ( LOAD_MODE, CNTRL_ARRAY [ CONTROL_2 ] );
00000280 2    WRITE_CNTRL_WRD ( CONTROL_2, CNTRL_ARRAY [ CONTROL_2 ] );
00000292 2    (* Put memory in load/unload mode *)
00000292 2    CLEAR_BITS ( MEM_LOAD_MODE, CNTRL_ARRAY [ CONTROL_BYTE ] );
000002A6 2    WRITE_CNTRL_WRD ( CONTROL_BYTE, CNTRL_ARRAY [ CONTROL_BYTE ] );
000002B8 2    (* Set function generators/fast sequencer mode to load/unload *)
000002B8 2    CLEAR_BITS ( GEN_FSR_MEAS_MD, CNTRL_ARRAY [ CONTROL_2 ] );
000002CC 2    (* Release the emulation break *)
000002CC 2    CLEAR_BITS ( RELEASE_EMUL, CNTRL_ARRAY [ CONTROL_2 ] );
000002E0 2    WRITE_CNTRL_WRD ( CONTROL_2, CNTRL_ARRAY [ CONTROL_2 ] );
000002F2 2    (* Make the memory adrs counter transperent to allow access to RAM *)
000002F2 2    CLEAR_BITS ( MAC_TRANSPARENT, CNTRL_ARRAY [ CONTROL_BYTE ] );
00000306 2    WRITE_CNTRL_WRD ( CONTROL_BYTE, CNTRL_ARRAY [ CONTROL_BYTE ] );
00000318 2    (* If on IMB, hold it off *)
00000318 2    IF TEST_BITS ( RECEIVING_LME, CNTRL_ARRAY [ CONTROL_1 ] ) = TRUE
00000332 2      THEN (* On the bus *)
00000332 2        BEGIN (* Hold up IMB bus *)
00000332 2          SET_BITS ( HOLD_LME, CNTRL_ARRAY [ CONTROL_1 ] );
00000344 2          WRITE_CNTRL_WRD ( CONTROL_1, CNTRL_ARRAY [ CONTROL_1] )
00000352 2        END (* Hold up IMB bus *)
00000352 2  END; (* Procedure HALT_HW *)
00000000 1  $GLOBPROC OFF$
00000000 1  .

End of compilation, number of errors=     0
00000000 1  "68000" PREPROCESS
00000000 1  $EXTENSIONS ON$
00000000 1  $TITLE "Soda Dynamic/Static Controller Symbol Utilities"
00000000 1  PROGRAM SYM_UTLS;
00000000 1  (*
```

```
00000000 1 ********************************** SYM_UTLS ******************************
00000000 1   SYM_UTLS is the module containing all the Pascal symbol routines
00000000 1   necessary for the Dynamic and Static Controller.  These routines are
00000000 1   responsible for creation and access to the symbol table used by the
00000000 1   Controllers.  SYM_UTLS is processor independent.
00000000 1   Author:  Kip Fulghum
00000000 1   Date:  9-20-82  Revised:  11-6-84
00000000 1 ****************************************************************************
00000000 1
00000000 1   SYM_UTLS contains the following routines:
00000000 1   -Function COMARE_SYMBOLS compares two address ranges for inclusion or
00000000 1    adjacency.
00000000 1   -Procedure BUILD_UNI_TAB builds a symbol table containing unique
00000000 1    symbols from the measurement structure.
00000000 1   -Procedure ADJUST_TAB adjusts a symbol table so as to contain adjacent
00000000 1    symbol information.
00000000 1   -Global procedure BUILD_SYM_TAB builds a symbol table from all the
00000000 1    unique/adjacent symbols in the measurement structure.
00000000 1   -Global function FIND_STATIC returns the index of the record in
00000000 1    the symbol table structure related to the given static data.
00000000 1   -Global function FIND_DYNAMIC returns the index of the record in
00000000 1    the symbol table structure related to the given dynamic data.
00000000 1   -Global function FIND_INDEX returns the index of the symbol whose
00000000 1    measurement structure index is given.
00000000 1
00000000 1   In addition, the following external procedures and functions are
00000000 1   used:  TEST_BITS and P_ADDR.
00000000 1                                                                        *)
00000000 1 (*
00000000 1                         ***************************
00000000 1                         ***** Include Files *****
00000000 1                         ***************************
00000000 1                                                                        *)
00000000 1
00000000 1 #INCLUDE COM_TYPES:SS_DYN
00000000 1
00000000 1 #INCLUDE ICMD_DATA:SODAMON
00000000 1
00000000 1
00000000 1
00000000 1
00000000 1
00000000 1 (*
00000000 1                           **********************
00000000 1                           ***** TEST_BITS *****
00000000 1                           **********************
00000000 1                                                                        *)
00000000 1 FUNCTION TEST_BITS ( BIT_WORD, TEST_WORD:  L_INT ):  BOOLEAN; EXTERNAL;
00000000 1 (*
00000000 1   Function TEST_BITS to see if all of the bits indicated in BIT_WORD
00000000 1   are set in TEST_WORD, ie "AND" both words and see if the result is
00000000 1   equal to BIT_WORD.  Provided as an assembly language external.
00000000 1                                                                        *)
00000000 1
00000000 1
00000000 1
00000000 1
00000000 1
00000000 1 (*
00000000 1                            ********************
00000000 1                            ***** P_ADDR *****
00000000 1                            ********************
00000000 1                                                                        *)
00000000 1 PROCEDURE P_ADDR ( LOGICAL_ADDR:  L_INT; VAR PHYSICAL_ADDR:  L_INT );
00000000 2                  EXTERNAL;
00000000 1 (*
00000000 1   Procedure P_ADDR to return the physical address equivalent of the
00000000 1   given logical address.  Provided as a Pascal external.
00000000 1                                                                        *)
00000000 1
00000000 1
00000000 1
00000000 1
00000000 1
```

```
00000000 1 (*
00000000 1                    ****************************
00000000 1                    ***** COMPARE_SYMBOLS *****
00000000 1                    ****************************
00000000 1                                                            *)
00000000 1 FUNCTION COMPARE_SYMBOLS ( SYM1_ADRS, SYM1_SIZE:  L_INT; SYM1_STATUS,
00000000 2                        SYM1_FLAGS, SYM1_PROG, SYM1_PROC:  S_INT;
00000000 2                        SYM2_ADRS, SYM2_SIZE:  L_INT; SYM2_STATUS,
00000000 2                        SYM2_FLAGS, SYM2_PROG, SYM2_PROC:  S_INT ):
00000000 2                        S_INT;
00000002 2 (*
00000002 2   Function COMPARE_SYMBOLS to compare two symbol address ranges for
00000002 2   inclusion or adjacency.  Function first checks to see if the ranges
00000002 2   are of the same type:  dynamic or static.  If they are dynamic, the
00000002 2   program and procedure numbers are also checked to make sure that
00000002 2   they are the same.  If the ranges pass this first test, then they
00000002 2   are checked to see if one is included in the other, as well as
00000002 2   checking to see if they are adjacent or equivalent.
00000002 2
00000002 2   COMPARE_SYMBOLS uses the following routine:  P_ADDR.
00000002 2
00000002 2   NOTE:  SYM1_ADRS and SYM2_ADRS are passed in as value parameters.
00000002 2          This routine CHANGES them for its own purposes.  If they are
00000002 2          ever passed in by reference, locals must be declared and used
00000002 2          instead!
00000002 2
00000002 2   Input:  1) SYM1_ADRS, the base address of the first symbol
00000002 2           2) SYM1_SIZE, the size of the first symbol
00000002 2           3) SYM1_STATUS, the read/write information for the first
00000002 2              symbol
00000002 2           4) SYM1_FLAGS, the data base bit codes for the first symbol
00000002 2              ( ie static/dynamic information )
00000002 2           5) SYM1_PROG, the program # for the first symbol
00000002 2           6) SYM1_PROC, the procedure # for the first symbol
00000002 2           7) SYM2_ADRS, the base address of the second symbol
00000002 2           8) SYM2_SIZE, the size of the second symbol
00000002 2           9) SYM2_STATUS, the read/write information for the second
00000002 2              symbol
00000002 2          10) SYM2_FLAGS, the data base bit codes for the second symbol
00000002 2              ( ie static/dynamic information )
00000002 2          11) SYM2_PROG, the program # for the second symbol
00000002 2          12) SYM2_PROC, the procedure # for the second symbol
00000002 2   Output:  1) result of comparison, in function name:
00000002 2               -1 indicates no comparison
00000002 2                0 indicates symbols are identical
00000002 2                1 indicates symbol #1 contains symbol #2
00000002 2                2 indicates symbol #2 contains symbol #1
00000002 2                3 indicates symbol #1 is low adjacent to symbol #2
00000002 2                  ( ie it is adjacent and below )
00000002 2                4 indicates symbol #2 is low adjacent to symbol #1
00000002 2                  ( ie it is adjacent and below )
00000002 2                                                            *)
00000002 2 VAR
00000002 2
00000002 2   SYMBOL_CODE:  S_INT; (* Storage for return value *)
00000004 2
00000004 2   SYM1_MAX:  L_INT; (* Symbol #1 maximum address *)
00000008 2
00000008 2   SYM2_MAX:  L_INT; (* Symbol #2 maximum address *)
0000000C 2
0000000C 2   SYM1_TEST:  BOOLEAN; (* Symbol #1 static/dynamic test *)
0000000D 2
0000000D 2   SYM2_TEST:  BOOLEAN; (* Symbol #2 static/dynamic test *)
00000004 2
00000004 2 BEGIN (* Function COMPARE_SYMBOLS *)
00000004 2   SYMBOL_CODE := -1; (* Assume no comparison *)
0000000A 2   SYM1_TEST := TEST_BITS ( 8, SYM1_FLAGS );
00000022 2   SYM2_TEST := TEST_BITS ( 8, SYM2_FLAGS );
0000003A 2   IF ( SYM1_SIZE <> -1 ) AND ( SYM2_SIZE <> -1 ) AND
0000003A 2      ( ( ( SYM1_TEST = TRUE ) AND ( SYM2_TEST = TRUE ) AND
0000003A 2      ( SYM1_PROG = SYM2_PROG ) AND ( SYM1_PROC = SYM2_PROC ) ) OR
0000003A 2      ( ( SYM1_TEST = FALSE ) AND ( SYM2_TEST = FALSE ) ) )
000000B8 2     THEN (* Both symbols are not pointers AND both are dynamic and
000000B8 2             in the same program and procedure or both are static *)
```

```
000000B8  2        BEGIN (* See if there are any similarities *)
000000B8  2          IF SYM1_TEST = FALSE
000000C0  2            THEN (* Dealing with static variables *)
000000C0  2              BEGIN (* Convert addresses to physical *)
000000C0  2                P_ADDR ( SYM1_ADRS, SYM1_ADRS );
000000CE  2                P_ADDR ( SYM2_ADRS, SYM2_ADRS )
000000DC  2              END; (* Convert addresses to physical *)
000000DC  2          SYM1_MAX := SYM1_ADRS + SYM1_SIZE - 1;
000000EA  2          SYM2_MAX := SYM2_ADRS + SYM2_SIZE - 1;
000000F8  2          IF ( SYM1_ADRS <= SYM2_ADRS ) AND ( SYM1_MAX >= SYM2_MAX ) AND
000000F8  2             ( ( SYM1_STATUS = SYM2_STATUS ) OR
000000F8  2             ( SYM1_STATUS = READ_WRITE ) )
00000130  2            THEN (* Symbol #1 contains symbol #2 *)
00000130  2              SYMBOL_CODE := 1;
00000136  2          IF ( SYM2_ADRS <= SYM1_ADRS ) AND ( SYM2_MAX >= SYM1_MAX ) AND
00000136  2             ( ( SYM2_STATUS = SYM1_STATUS ) OR
00000136  2             ( SYM2_STATUS = READ_WRITE ) )
00000174  2            THEN (* Symbol #2 contains symbol #1 *)
00000174  2              SYMBOL_CODE := 2;
0000017A  2          IF ( SYM1_MAX+1 = SYM2_ADRS ) AND ( SYM1_STATUS = SYM2_STATUS )
0000019E  2            THEN (* Symbol #1 is low adjacent to symbol #2 *)
0000019E  2              SYMBOL_CODE := 3;
000001A4  2          IF ( SYM2_MAX+1 = SYM1_ADRS ) AND ( SYM2_STATUS = SYM1_STATUS )
000001C8  2            THEN (* Symbol #2 is low adjacent to symbol #1 *)
000001C8  2              SYMBOL_CODE := 4;
000001CE  2          IF ( SYM1_ADRS = SYM2_ADRS ) AND ( SYM1_MAX = SYM2_MAX ) AND
000001CE  2             ( SYM1_STATUS = SYM2_STATUS )
00000200  2            THEN (* Symbols are identical *)
00000200  2              SYMBOL_CODE := 0
00000204  2        END; (* See if there are any similarities *)
00000204  2    COMPARE_SYMBOLS := SYMBOL_CODE (* Assign final function value *)
0000020A  2  END; (* Function COMPARE_SYMBOLS *)
00000000  1
00000000  1
00000000  1
00000000  1
00000000  1
00000000  1  (*
00000000  1                          *************************
00000000  1                          ***** BUILD_UNI_TAB *****
00000000  1                          *************************
00000000  1                                                                   *)
00000000  1  PROCEDURE BUILD_UNI_TAB ( VAR MEAS_STRUCT:  CMD_DATA_ARRAY; VAR
00000000  2                            SYM_STRUCT:  SYM_DESCRIPS );
00000000  2  (*
00000000  2    Procedure BUILD_UNI_TAB to build a symbol table containing unique
00000000  2    symbols from the measurement structure.  Procedure finds all symbols
00000000  2    in the measurement structure.  If a symbol is not contained in
00000000  2    another symbol ( both address and read/write status ), it is
00000000  2    added to the symbol list and the symbol count is incremented.  If
00000000  2    there are too many symbols, the count is incremented, but the overflow
00000000  2    symbols are not put in the table.  Thus, the overflow count may not
00000000  2    indicate unique symbols in the error case.
00000000  2
00000000  2    BUILD_UNI_TAB uses the following function:  COMPARE_SYMBOLS.
00000000  2
00000000  2    Input:  1) MEAS_STRUCT, the structure describing the measurement
00000000  2               from the user's point of view
00000000  2    Output:  1) SYM_STRUCT, a record indicating all unique symbols in the
00000000  2                measurement structure, and a unique symbol count
00000000  2                                                                   *)
00000000  2  VAR
00000000  2
00000000  2    I:  S_INT; (* Outer WHILE loop index *)
00000002  2
00000002  2    J:  S_INT; (* Inner WHILE loop index *)
00000004  2
00000004  2    COUNT:  S_INT; (* Number of unique symbols *)
00000006  2
00000006  2    COMPARE_FLAG:  S_INT; (* Flag indicating result of symbol
00000008  2                            comparison *)
00000008  2
00000008  2    IN_SET:  CMD_INDEX_SET; (* Indeces of symbols included in others *)
00000218  2
```

```
00000218  2  BEGIN (* Procedure BUILD_UNI_TAB *)
00000218  2    COUNT := 0;
0000021C  2    IN_SET := [];
00000228  2    I := 0;
0000022C  2    WHILE MEAS_STRUCT [ I ].OP_CODE <> EOL DO
00000244  2      WITH MEAS_STRUCT [ I ] DO
00000254  2        BEGIN (* Build symbol table and count # of symbols *)
00000254  2          IF ( OP_CODE > COMMAND ) AND ( OP_CODE < SYMBOL )
00000270  2            THEN (* There is a symbol referenced in this record *)
00000270  2              BEGIN (* See if it should be added to table *)
00000270  2                J := I + 1;
0000027A  2                WHILE ( MEAS_STRUCT [ J ].OP_CODE <> EOL ) AND
0000027A  2                      NOT ( CMD_DATA_INDEX ( I ) IN IN_SET ) DO
000002C0  2                  BEGIN (* Compare symbol I with all others *)
000002C0  2                    IF ( MEAS_STRUCT [ J ].OP_CODE > COMMAND ) AND
000002C0  2                       ( MEAS_STRUCT [ J ].OP_CODE < SYMBOL )
000002F2  2                      THEN (* This is also a symbol *)
000002F2  2                        BEGIN (* See if symbol I is in J *)
000002F2  2                          COMPARE_FLAG := COMPARE_SYMBOLS (
000002F2  2                               ADDRESS, SIZE, STATUS, FLAGS,
000002F2  2                               FILE_NUM, PROC_NUM,
000002F2  2                               MEAS_STRUCT [ J ].ADDRESS,
000002F2  2                               MEAS_STRUCT [ J ].SIZE,
000002F2  2                               MEAS_STRUCT [ J ].STATUS,.
000002F2  2                               MEAS_STRUCT [ J ].FLAGS,
000002F2  2                               MEAS_STRUCT [ J ].FILE_NUM,
000002F2  2                               MEAS_STRUCT [ J ].PROC_NUM );
0000037C  2                          IF ( COMPARE_FLAG = 0 ) OR ( COMPARE_FLAG = 1 )
0000039A  2                            THEN (* Symbols are equal OR symbol I
0000039A  2                                    completely contains symbol J *)
0000039A  2                              IN_SET := IN_SET + [ CMD_DATA_INDEX ( J ) ];
000003D4  2                          IF COMPARE_FLAG = 2
000003E0  2                            THEN (* Symbol J completely contains symbol
000003E0  2                                    I *)
000003E0  2                              IN_SET := IN_SET + [ CMD_DATA_INDEX ( I ) ]
0000041A  2                        END; (* See if symbol I is in J *)
0000041A  2                    J := J + 1
0000041E  2                  END; (* Compare symbol I with all others *)
00000422  2                IF NOT ( CMD_DATA_INDEX ( I ) IN IN_SET )
00000448  2                  THEN (* Symbol should be added to list *)
00000448  2                    BEGIN (* Count the symbol *)
00000448  2                      COUNT := COUNT + 1;
0000044C  2                      IF COUNT <= MAX_SYMS
00000458  2                        THEN (* Still a legal symbol count *)
00000458  2                          WITH SYM_STRUCT.SYMBOL_ARRAY [ COUNT - 1 ] DO
0000046E  2                            BEGIN (* Add symbol I to found array *)
0000046E  2                              DESCRIP_INDEX := I;
00000472  2                              MEAS_SIZE := SIZE
00000480  2                            END (* Add symbol I to found array *)
00000480  2                    END (* Count the symbol *)
00000480  2              END; (* See if it should be added to table *)
00000480  2          I := I + 1
00000484  2        END; (* Build symbol table and count # of symbols *)
00000488  2    (* Finally, assign the number of symbols in measurement structure *)
00000488  2    SYM_STRUCT.SYMBOL_COUNT := COUNT
00000490  2  END; (* Procedure BUILD_UNI_TAB *)
00000000  1
00000000  1
00000000  1
00000000  1
00000000  1
00000000  1  (*
00000000  1                          ***********************
00000000  1                          ***** ADJUST_TAB *****
00000000  1                          ***********************
00000000  1                                                                  *)
00000000  1  PROCEDURE ADJUST_TAB ( VAR MEAS_STRUCT:  CMD_DATA_ARRAY; VAR
00000000  2                         SYM_STRUCT:  SYM_DESCRIPS );
00000000  2  (*
00000000  2   Procedure ADJUST_TAB to adjust a symbol table so as to contain
00000000  2   adjacent symbol information.  Procedure takes a table containing
00000000  2   unique symbols and makes a pass through it to check for adjacent
00000000  2   address ranges.  If two symbols are adjacent, the lower symbol's
```

```
00000000 2    measurement size is increased to include the upper symbol, and the
00000000 2    upper symbol's measurement size is set to 0 to indicate it is not
00000000 2    to be traced separately.
00000000 2
00000000 2    ADJUST_TAB uses the following function:  COMPARE_SYMBOLS.
00000000 2
00000000 2    Input:  1) MEAS_STRUCT, the structure describing the measurement
00000000 2               from the user's point of view
00000000 2            2) SYM_STRUCT, a record containing all unique symbols in the
00000000 2               measurement structure, and a unique symbol count
00000000 2    Output:  1) SYM_STRUCT, the updated record indicating adjacent symbol
00000000 2                information in the form of measurement sizes
00000000 2                                                                          *)
00000000 2  VAR
00000000 2
00000000 2    I:  S_INT; (* FOR loop index *)
00000002 2
00000002 2    J:  S_INT; (* Inner WHILE loop index *)
00000004 2
00000004 2    COMPARE_FLAG:  S_INT; (* Flag indicating result of symbol
00000498 2                            comparison *)
00000498 2
00000498 2  BEGIN (* Procedure ADJUST_TAB *)
00000498 2    FOR I := 0 TO SYM_STRUCT.SYMBOL_COUNT - 2 DO
000004B0 2      WITH SYM_STRUCT.SYMBOL_ARRAY [ I ] DO
000004C8 2        BEGIN (* Check for adjacency *)
000004C8 2          J := I + 1;
000004D2 2          WHILE ( J <= SYM_STRUCT.SYMBOL_COUNT - 1 ) AND
000004D2 2                ( MEAS_SIZE <> 0 ) DO
000004FA 2            BEGIN (* Compare symbol I with all others *)
000004FA 2              IF SYM_STRUCT.SYMBOL_ARRAY [ J ].MEAS_SIZE <> 0
00000512 2                THEN (* Symbol J hasn't been snarfed up yet *)
00000512 2                  BEGIN (* Check him out *)
00000512 2                    WITH MEAS_STRUCT [ SYM_STRUCT.SYMBOL_ARRAY [ J ].
00000512 2                         DESCRIP_INDEX ] DO
00000532 2                      COMPARE_FLAG := COMPARE_SYMBOLS (
00000532 2                           MEAS_STRUCT [ DESCRIP_INDEX ].ADDRESS,
00000532 2                           MEAS_SIZE,
00000532 2                           MEAS_STRUCT [ DESCRIP_INDEX ].STATUS,
00000532 2                           MEAS_STRUCT [ DESCRIP_INDEX ].FLAGS,
00000532 2                           MEAS_STRUCT [ DESCRIP_INDEX ].FILE_NUM,
00000532 2                           MEAS_STRUCT [ DESCRIP_INDEX ].PROC_NUM,
00000532 2                           ADDRESS, SYM_STRUCT.SYMBOL_ARRAY [ J ].
00000532 2                           MEAS_SIZE, STATUS, FLAGS, FILE_NUM, PROC_NUM );
000005C6 2                    IF COMPARE_FLAG = 3
000005D2 2                      THEN (* Symbol I is adjacent and below symbol J *)
000005D2 2                        BEGIN (* Have symbol I snarf up symbol J *)
000005D2 2                          MEAS_SIZE := MEAS_SIZE + SYM_STRUCT.
000005D2 2                            SYMBOL_ARRAY [ J ].MEAS_SIZE;
000005F6 2                          SYM_STRUCT.SYMBOL_ARRAY [ J ].MEAS_SIZE := 0;
0000060E 2                          (* Reset inner loop count.  This makes sure
0000060E 2                             we go back and find symbols that were:
0000060E 2                             1) above but not adjacent to symbol I, and
0000060E 2                             2) above AND adjacent to symbol J, which is
0000060E 2                                now part of symbol I
0000060E 2                             If you understand what I just said, you're
0000060E 2                             one up on me... *)
0000060E 2                          J := I
00000614 2                        END; (* Have symbol I snarf up symbol J *)
00000614 2                    IF COMPARE_FLAG = 4
00000620 2                      THEN (* Symbol J is adjacent and below symbol I *)
00000620 2                        BEGIN (* Have symbol J snarf up symbol I *)
00000620 2                          SYM_STRUCT.SYMBOL_ARRAY [ J ].MEAS_SIZE :=
00000620 2                            SYM_STRUCT.SYMBOL_ARRAY [ J ].MEAS_SIZE +
00000620 2                            MEAS_SIZE;
00000654 2                          MEAS_SIZE := 0
0000065C 2                        END (* Have symbol J snarf up symbol I *)
0000065C 2                  END; (* Check him out *)
0000065C 2              J := J + 1
00000660 2            END (* Compare symbol I with all others *)
00000664 2        END (* Check for adjacency *)
00000678 2  END; (* Procedure ADJUST_TAB *)
00000000 1
00000000 1
```

```
00000000  1
00000000  1
00000000  1
00000000  1  (*
00000000  1                          ***************************
00000000  1                          ***** BUILD_SYM_TAB *****
00000000  1                          ***************************
00000000  1                                                                                *)
00000000  1  $GLOBPROC ONS
00000000  1  PROCEDURE BUILD_SYM_TAB ( VAR MEAS_STRUCT:  CMD_DATA_ARRAY; VAR
00000000  2                             SYM_STRUCT:  SYM_DESCRIPS );
00000680  2  (*
00000680  2    Procedure BUILD_SYM_TAB to build a symbol table from all the unique/
00000680  2    adjacent symbols in the measurement structure.  Procedure first
00000680  2    builds a table of all unique symbols in the measurement structure.
00000680  2    If the table does not overflow, adjacent symbols are the looked for
00000680  2    in the previously created table.  The result is a table of unique
00000680  2    symbols with indicators as to adjacency.
00000680  2
00000680  2    BUILD_SYM_TAB uses the following routines:  BUILD_UNI_TAB and
00000680  2    ADJUST_TAB.
00000680  2
00000680  2    Input:  1) MEAS_STRUCT, the structure describing the measurement
00000680  2               from the user's point of view
00000680  2    Output:  1) SYM_STRUCT, a record containing all unique/adjacent symbols
00000680  2                in the measurement structure, and a unique symbol count
00000680  2                                                                                *)
00000680  2  BEGIN (* Procedure BUILD_SYM_TAB *)
00000680  2    (* Start first pass through table to check for unique symbols *)
00000680  2    BUILD_UNI_TAB ( MEAS_STRUCT, SYM_STRUCT );
00000692  2    (* Start second pass through table to check for adjacent symbols *)
00000692  2    IF SYM_STRUCT.SYMBOL_COUNT <= MAX_SYMS
000006A0  2      THEN (* Valid number of symbols *)
000006A0  2        ADJUST_TAB ( MEAS_STRUCT, SYM_STRUCT )
000006B2  2  END; (* Procedure BUILD_SYM_TAB *)
00000000  1  $GLOBPROC OFFS
00000000  1
00000000  1
00000000  1
00000000  1
00000000  1
00000000  1  (*
00000000  1                          *************************
00000000  1                          ***** FIND_STATIC *****
00000000  1                          *************************
00000000  1                                                                                *)
00000000  1  $GLOBPROC ONS
00000000  1  FUNCTION FIND_STATIC ( VAR MEAS_STRUCT:  CMD_DATA_ARRAY; VAR
00000000  2                         SYM_STRUCT:  SYM_DESCRIPS; EMUL_ADRS:  L_INT ):
00000000  2                         S_INT;
00000002  2  (*
00000002  2    Function FIND_STATIC to return the index of the record in the
00000002  2    symbol table structure related to the given static data.
00000002  2
00000002  2    FIND_STATIC uses the following routines:  TEST_BITS and P_ADDR.
00000002  2
00000002  2    Input:  1) MEAS_STRUCT, the structure describing the measurement
00000002  2            2) SYM_STRUCT, the list of all symbols in the measurement
00000002  2               structure
00000002  2            3) EMUL_ADRS, the actual static physical address whose symbol
00000002  2               information is to be found
00000002  2    Output:  1) index into SYM_STRUCT of static symbol related to given
00000002  2                EMUL_ADRS, in function name ( or -1 indicating no mapping
00000002  2                found )
00000002  2                                                                                *)
00000002  2  VAR
00000002  2
00000002  2    I:  S_INT; (* WHILE loop index *)
00000004  2
00000004  2    INDEX:  S_INT; (* Index into structure of symbol *)
00000006  2
00000006  2    P_ADRS:  L_INT; (* Physical address of symbol *)
000006BA  2
```

```
000006BA  2  BEGIN (* Function FIND_STATIC *)
000006BA  2    I := 0; (* Start you-know-where *)
000006BE  2    (* Set index to indicate nothing found *)
000006BE  2    INDEX := -1;
000006C4  2    WHILE ( I < SYM_STRUCT.SYMBOL_COUNT ) AND ( INDEX = -1 ) DO
000006E8  2      WITH MEAS_STRUCT [ SYM_STRUCT.SYMBOL_ARRAY [ I ].DESCRIP_INDEX ] DO
00000708  2        BEGIN (* Check out this symbol *)
00000708  2          P_ADDR ( ADDRESS, P_ADRS ); (*  Logical --> physical *)
00000716  2          IF ( TEST_BITS ( 8, FLAGS ) = FALSE ) AND
00000716  2             ( EMUL_ADRS >= P_ADRS ) AND ( EMUL_ADRS <= P_ADRS+SIZE-1 )
00000764  2            THEN (* Symbol we are looking for and this symbol in table are
00000764  2                    both static and EMUL_ADRS is in range *)
00000764  2              INDEX := I;
0000076A  2          I := I + 1
0000076E  2        END; (* Check out this symbol *)
00000772  2    FIND_STATIC := INDEX (* Assign final function value *)
00000778  2  END; (* Function FIND_STATIC *)
00000000  1  $GLOBPROC OFF$
00000000  1
00000000  1
00000000  1
00000000  1
00000000  1
00000000  1  (*
00000000  1                           ************************
00000000  1                           ***** FIND_DYNAMIC *****
00000000  1                           ************************
00000000  1                                                                             *)
00000000  1  $GLOBPROC ON$
00000000  1  FUNCTION FIND_DYNAMIC ( VAR MEAS_STRUCT:  CMD_DATA_ARRAY; VAR
00000000  2                          SYM_STRUCT:  SYM_DESCRIPS; EMUL_OFST:
00000000  2                          L_INT; PROG, PROC:  S_INT ):  S_INT;
00000002  2  (*
00000002  2    Function FIND_DYNAMIC to return the index of the record in the
00000002  2    symbol table structure related to the given dynamic data.
00000002  2
00000002  2    FIND_DYNAMIC uses the following routine:  TEST_BITS.
00000002  2
00000002  2    Input:  1) MEAS_STRUCT, the structure describing the measurement
00000002  2            2) SYM_STRUCT, the list of all symbols in the measurement
00000002  2               structure
00000002  2            3) EMUL_OFST, the dynamic offset from the stack pointer
00000002  2               of the symbol whose information is to be found
00000002  2            4) PROG, the program # in which the dynamic variable is
00000002  2               located
00000002  2            5) PROC, the procedure # in which the dynamic variable is
00000002  2               located
00000002  2    Output:  1) index into SYM_STRUCT of dynamic symbol related to given
00000002  2                EMUL_OFST, in function name ( or -1 indicating no mapping
00000002  2                found )
00000002  2                                                                             *)
00000002  2  VAR
00000002  2
00000002  2    I:  S_INT; (* WHILE loop index *)
00000004  2
00000004  2    INDEX:  S_INT; (* Index into structure of symbol *)
00000786  2
00000786  2  BEGIN (* Function FIND_DYNAMIC *)
00000786  2    I := 0; (* Start you-know-where *)
0000078A  2    (* Set index to indicate nothing found *)
0000078A  2    INDEX := -1;
00000790  2    WHILE ( I < SYM_STRUCT.SYMBOL_COUNT ) AND ( INDEX = -1 ) DO
000007B4  2      WITH MEAS_STRUCT [ SYM_STRUCT.SYMBOL_ARRAY [ I ].DESCRIP_INDEX ] DO
000007D4  2        BEGIN (* Check out this symbol *)
000007D4  2          IF ( TEST_BITS ( 8, FLAGS ) = TRUE ) AND
000007D4  2             ( FILE_NUM = PROG ) AND ( PROC_NUM = PROC ) AND
000007D4  2             ( EMUL_OFST >= ADDRESS ) AND ( EMUL_OFST <= ADDRESS+SIZE-1 )
0000083E  2            THEN (* Symbol we are looking for and this symbol in table are
0000083E  2                    both dynamic, in the same prog and proc, and EMUL_OFST
0000083E  2                    is in range *)
0000083E  2              INDEX := I;
00000844  2          I := I + 1
00000848  2        END; (* Check out this symbol *)
```

```
0000084C 2   FIND_DYNAMIC := INDEX (* Assign final function value *)
00000852 2  END; (* Function FIND_DYNAMIC *)
00000000 1  $GLOBPROC OFF$
00000000 1
00000000 1
00000000 1
00000000 1
00000000 1
00000000 1  (*
00000000 1                          ***********************
00000000 1                          ***** FIND_INDEX *****
00000000 1                          ***********************
00000000 1                                                                      *)
00000000 1  $GLOBPROC ON$
00000000 1  FUNCTION FIND_INDEX ( VAR SYM_STRUCT:  SYM_DESCRIPS, MEAS_INDEX:
00000000 2                         S_INT ):  S_INT;
00000002 2  (*
00000002 2    Function FIND_INDEX to return the index of the symbol whose
00000002 2    measurement structure index is given.  Function simply looks through
00000002 2    the symbol table indeces into the measurement structure until it
00000002 2    finds a symbol with that index, then returns the symbol index.
00000002 2
00000002 2    Input:  1) SYM_STRUCT, the list of all symbols in the measurement
00000002 2                structure
00000002 2            2) MEAS_INDEX, the index into the measurement structure we
00000002 2                are looking for
00000002 2    Output:  1) index into SYM_STRUCT of the symbol whose MEAS_INDEX
00000002 2                was given, in function name, or -1 indicating no such
00000002 2                index
00000002 2                                                                      *)
00000002 2  VAR
00000002 2
00000002 2    I:  S_INT; (* WHILE loop index *)
00000004 2
00000004 2    INDEX:  S_INT; (* Index into structure of symbol *)
00000860 2
00000860 2  BEGIN (* Function FIND_INDEX *)
00000860 2    I := 0; (* Start you-know-where *)
00000864 2    INDEX := -1; (* Set index to indicate nothing found *)
0000086A 2    WHILE ( I < SYM_STRUCT.SYMBOL_COUNT ) AND ( INDEX = -1 ) DO
0000088E 2      BEGIN (* Check out this symbol *)
0000088E 2        IF SYM_STRUCT.SYMBOL_ARRAY [ I ].DESCRIP_INDEX = MEAS_INDEX
000008A6 2          THEN (* This is it:  the symbol we are looking for *)
000008A6 2            INDEX := I;
000008AC 2        I := I + 1
000008B0 2      END; (* Check out this symbol *)
000008B2 2    (* Assign function value *)
000008B2 2    FIND_INDEX := INDEX
000008B8 2  END; (* Function FIND_INDEX *)
00000000 1  $GLOBPROC OFF$
00000000 1  .

508: Warning: field or entry alignment; record or array comparisons may not work

End of compilation, number of errors=    0
00000000 1  "68000" PREPROCESS
00000000 1  $EXTENSIONS ON$
00000000 1  $TITLE "Soda Dynamic/Static Controller Message Utilities"
00000000 1  PROGRAM MSG_UTLS;
00000000 1  (*
00000000 1  ******************************** MSG_UTLS ********************************
00000000 1    MSG_UTLS is the module containing all the routines for putting up
00000000 1    status and error messages for the Dynamic and Static Controllers.
00000000 1    All load, run, and unload status/error messages go through this guy
00000000 1    first.  MSG_UTLS is processor independent.
00000000 1    Author:  Kip Fulghum
00000000 1    Date:  9-22-83  Revised:  9-6-84
00000000 1  ****************************************************************************
00000000 1
00000000 1    MSG_UTLS contains the following routines:
00000000 1    -Global procedure LOAD_MSG puts up the loading message.
00000000 1    -Global procedure RUN_MSG updates the current run message
00000000 1     appropriately.
```

```
00000000 1     -Global procedure UNLOAD_MSG updates the current unload message with
00000000 1      the given count.
00000000 1     -Global procedure EXIT_MSG puts up the appropriate final status/error
00000000 1      message.
00000000 1
00000000 1    MSG_UTLS also uses the following external routines:  P_MESSAGE,
00000000 1    P_FILE_ERR, M_FILE_ERR, EMUL_MSG, FORMAT, and TEST_FEATURE.
00000000 1                                                                          *)
00000000 1  (*
00000000 1                        *************************
00000000 1                        ***** Include Files *****
00000000 1                        *************************
00000000 1                                                                          *)
00000000 1
00000000 1  #INCLUDE ER_CONST:SS_DYN
00000000 1
00000000 1  #INCLUDE DEBUG_CONST:SS_DYN
00000000 1
00000000 1  #INCLUDE COM_TYPES:SS_DYN
00000000 1
00000000 1  #INCLUDE LD_TYPES:SS_DYN
00000000 1
00000000 1  #INCLUDE MSG_TYPES:SS_DYN
00000000 1
00000000 1  #INCLUDE FM_TYPES:SS_DYN
00000000 1
00000000 1
00000000 1
00000000 1
00000000 1
00000000 1  CONST
00000000 1
00000000 1    OVERFLOW = 002BH; (* "+" - overflow indicator for run-time message *)
00000000 1
00000000 1    R_PAREN  = 2920H; (* ") " - right parentheses for no rec executing
00000000 1                         msg *)
00000000 1
00000000 1    COMMA    = 2C20H; (* ", " - comma for rec executing message *)
00000000 1
00000000 1  VAR
00000000 1
00000000 1  $EXTVAR ON$
00000000 1
00000000 1    PRCSS_MSG_TBL:  MSG_TABLE; (* Dynamic/Static Process message table *)
00000000 1
00000000 1    FOOTDC_INFO:  FOOTDC_INFO_TYPE; (* Trace file information *)
00000000 1
00000000 1    DEBUG_FLAG:  S_INT; (* Flag for debug options *)
00000000 1
00000000 1  $EXTVAR OFF$
00000000 1
00000000 1
00000000 1
00000000 1
00000000 1
00000000 1  $CALL_ABS_LONG$
00000000 1  (*
00000000 1                          *********************
00000000 1                          ***** P_MESSAGE *****
00000000 1                          *********************
00000000 1                                                                          *)
00000000 1  PROCEDURE P_MESSAGE ( MESSAGE:  MSG_PTR; MSG_CODE:  S_INT ); EXTERNAL;
00000000 1  (*
00000000 1    Procedure P_MESSAGE to interface to the Pisces status line message
00000000 1    routine, MESSAGE.  P_MESSAGE uses MESSAGE to output the given
00000000 1    message to the display given the ascii string, its length, and a
00000000 1    message code indicating what type of message it is and how it is to
00000000 1    be cleared.
00000000 1                                                                          *)
00000000 1
00000000 1
00000000 1
00000000 1
00000000 1
```

```
00000000 1  (*
00000000 1                        ***********************
00000000 1                        ***** P_FILE_ERR *****
00000000 1                        ***********************
00000000 1                                                              *)
00000000 1  PROCEDURE P_FILE_ERR ( VAR DCB:  DCB_TYPE; FMGR_CODE: S_INT ); EXTERNAL;
00000000 1  (*
00000000 1    Procedure P_FILE_ERR to interface and expand on the file manager
00000000 1    routine FILE_ERR.  P_FILE_ERR uses FILE_ERR to output an appropriate
00000000 1    file manager error message to the display given the file's DCB and
00000000 1    the file manager error code.
00000000 1                                                              *)
00000000 1
00000000 1
00000000 1
00000000 1
00000000 1
00000000 1  (*
00000000 1                        ***********************
00000000 1                        ***** M_FILE_ERR *****
00000000 1                        ***********************
00000000 1                                                              *)
00000000 1  PROCEDURE M_FILE_ERR ( VAR DCB:  DCB_TYPE; FMGR_CODE: S_INT ); EXTERNAL;
00000000 1  (*
00000000 1    Procedure M_FILE_ERR to output an appropriate trace memory file error
00000000 1    message.  Provided as a Pascal external.
00000000 1                                                              *)
00000000 1
00000000 1
00000000 1
00000000 1
00000000 1
00000000 1  (*
00000000 1                         *********************
00000000 1                         ***** EMUL_MSG *****
00000000 1                         *********************
00000000 1                                                              *)
00000000 1  PROCEDURE EMUL_MSG ( STACK_MSG:  BOOLEAN ); EXTERNAL;
00000000 1  (*
00000000 1    Procedure EMUL_MSG to update the status line with current emulation
00000000 1    status.  Provided as part of the message handler.
00000000 1                                                              *)
00000000 1
00000000 1
00000000 1
00000000 1
00000000 1
00000000 1  $CALL_PC_SHORTS
00000000 1  (*
00000000 1                          *******************
00000000 1                          ***** FORMAT *****
00000000 1                          *******************
00000000 1                                                              *)
00000000 1  PROCEDURE FORMAT ( SIGNED:  BOOLEAN; VAR SOURCE:  S_INT; SOURCE_SIZE:
00000000 2                    S_INT; VAR DEST, DEST_SIZE:  S_INT; BASE,
00000000 2                    JUSTIFY:  S_INT ); EXTERNAL;
00000000 1  (*
00000000 1    Procedure FORMAT to format numbers into ascii strings.  FORMAT
00000000 1    interfaces to the Pisces FORMATTER.  Provided as a Pascal external.
00000000 1                                                              *)
00000000 1
00000000 1
00000000 1
00000000 1
00000000 1
00000000 1  (*
00000000 1                       *************************
00000000 1                       ***** TEST_FEATURE *****
00000000 1                       *************************
00000000 1                                                              *)
00000000 1  FUNCTION TEST_FEATURE ( VAR FEAT_SIG:  FEATURE_REC ):  CONDITION_TYPE;
00000001 2                       EXTERNAL;
00000000 1  (*
```

```
00000000 1    Function TEST_FEATURE to test to see if a given feature is turned
00000000 1    on or not.  Provided as a Pascal external.
00000000 1                                                                   *)
00000000 1
00000000 1
00000000 1
00000000 1
00000000 1
00000000 1  (*
00000000 1                            ********************
00000000 1                            ***** LOAD_MSG *****
00000000 1                            ********************
00000000 1                                                                   *)
00000000 1  $GLOBPROC ON$
00000000 1  PROCEDURE LOAD_MSG ( FIRST:  BOOLEAN );
00000004 2  (*
00000004 2    Procedure LOAD_MSG to put up the loading message.  If this is the
00000004 2    initial load, the message is put up, otherwise nothing is done.
00000004 2
00000004 2    LOAD_MSG uses the following routine:  P_MESSAGE.
00000004 2
00000004 2    Input:  1) FIRST, a flag indicating if this is the first load
00000004 2    Output:  none
00000004 2                                                                   *)
00000004 2  BEGIN (* Procedure LOAD_MSG *)
00000004 2    IF FIRST = TRUE
00000010 2      THEN (* This is the first load *)
00000010 2        P_MESSAGE ( PRCSS_MSG_TBL [ 1 ], CLR_STATUS_MSG )
00000020 2  END; (* Procedure LOAD_MSG *)
00000000 1  $GLOBPROC OFF$
00000000 1
00000000 1
00000000 1
00000000 1
00000000 1
00000000 1  (*
00000000 1                            *******************
00000000 1                            ***** RUN_MSG *****
00000000 1                            *******************
00000000 1                                                                   *)
00000000 1  $GLOBPROC ON$
00000000 1  PROCEDURE RUN_MSG ( VAR FLG_ARRAY:  FLAG_ARRAY_TYPE; VAR TRACE_SPEC:
00000000 2                      TRACE_SPEC_REC; STATE, RECS:  S_INT; RT_FLAG:
00000000 2                      BOOLEAN );
00000000 2  (*
00000000 2    Procedure RUN_MSG to update the current run message appropriately.
00000000 2    Procedure outputs either real-time or non-real-time messages,
00000000 2    waiting on enable or capturing data messages, depending on a twisted
00000000 2    bunch of logic.
00000000 2
00000000 2    RUN_MSG uses the following routines:  FORMAT, TEST_FEATURE, and
00000000 2    P_MESSAGE.
00000000 2
00000000 2    Input:  1) FLG_ARRAY, the array of most recently read hardware flags
00000000 2            2) TRACE_SPEC, the current trace being run
00000000 2            3) STATE, the # of captured states
00000000 2            4) RECS, the number of data records created
00000000 2            5) RT_FLAG, a flag indicating if the measurement is real-time
00000000 2               ( TRUE ) or non-real-time ( FALSE )
00000000 2    Output:  none
00000000 2                                                                   *)
00000000 2  VAR
00000000 2
00000000 2    FORMAT_SIZE:  S_INT; (* Returned size from FORMAT *)
00000002 2
00000002 2    MSG_NO:  S_INT; (* # of message to output *)
00000004 2
00000004 2    MSG_LENGTH:  S_INT; (* Length of message to output *)
00000006 2
00000006 2    TYPE_NO:  S_INT; (* Type # of message to be output:  rt vs. nrt *)
00000008 2
```

```
00000008 2    OUT_STATE:  S_INT; (* # to be output in message *)
0000000A 2
0000000A 2    I:  S_INT; (* FOR loop index *)
00000028 2
00000028 2  BEGIN (* Procedure RUN_MSG *)
00000028 2    IF ( TRACE_SPEC.UM_REQUEST = UM_ENABLES ) OR ( ( TEST_FEATURE
00000028 2       ( TRACE_SPEC.HW_SPEC.FEATURES [ START_ARM_STORE ] ) = ON ) AND
00000028 2       ( NOT ( START_BIT IN FLAG_1_SET ( FLG_ARRAY [ FLAG_1 ] ) ) ) )
00000076 2      THEN (* Enable specified but not found yet *)
00000076 2        BEGIN (* Put out appropriate enable message *)
00000076 2          FORMAT_SIZE := 2;
0000007C 2          MSG_NO := 2;
00000082 2          (* Get sequence state:  X generator! *)
00000082 2          OUT_STATE := SHIFT ( SHIFT ( FLG_ARRAY [ FLAG_3 ], 8 ), -12 );
00000096 2          (* Put state into message *)
00000096 2          FORMAT ( FALSE, OUT_STATE, 2, PRCSS_MSG_TBL [ MSG_NO ]^.TEXT
00000096 2                   [ 27 ], FORMAT_SIZE, 10, -1 )
000000D0 2        END (* Put out appropriate enable message *)
000000D4 2      ELSE (* No enable or it has been found *)
000000D4 2        BEGIN (* Put out appropriate running message *)
000000D4 2          FORMAT_SIZE := 4;
000000DA 2          MSG_NO := 3;
000000E0 2          IF RECS = 0
000000E8 2            THEN (* There are no saved records *)
000000E8 2              BEGIN (* Set up no record message *)
000000E8 2                PRCSS_MSG_TBL [ MSG_NO ]^.TEXT [ 21 ] := R_PAREN;
00000104 2                MSG_LENGTH := 21
0000010A 2              END (* Set up no record message *)
0000010E 2            ELSE (* There are some saved records *)
0000010E 2              BEGIN (* Set up record count *)
0000010E 2                PRCSS_MSG_TBL [ MSG_NO ]^.TEXT [ 21 ] := COMMA;
0000012A 2                MSG_LENGTH := 28;
00000130 2                OUT_STATE := RECS * 2; (* Output byte count *)
0000013C 2                FORMAT ( FALSE, OUT_STATE, 2, PRCSS_MSG_TBL [ MSG_NO ]^.
0000013C 2                         TEXT [ 26 ], FORMAT_SIZE, 10, -1 )
00000176 2              END; (* Set up record count *)
00000176 2          OUT_STATE := STATE * 2; (* Output byte count *)
00000192 2          IF ( OUT_STATE > 9999 ) OR ( OUT_STATE < 0 )
0000019A 2            THEN (* Overflow *)
0000019A 2              BEGIN (* Set up overflow count *)
0000019A 2                FORMAT_SIZE := 3;
000001A0 2                PRCSS_MSG_TBL [ MSG_NO ]^.TEXT [ 20 ] := OVERFLOW
000001BC 2              END; (* Set up overflow count *)
000001BC 2          (* Put count into message *)
000001BC 2          FORMAT ( FALSE, OUT_STATE, 2, PRCSS_MSG_TBL [ MSG_NO ]^.TEXT
000001BC 2                   [ 19 ], FORMAT_SIZE, 10, -1 );
000001F6 2          IF TRACE_SPEC.UM_REQUEST = UM_COUNT_STAT
00000206 2            THEN (* All this work for nothing:  don't output count *)
00000206 2              IF RT_FLAG = TRUE
00000212 2                THEN (* Real-time *)
00000212 2                  MSG_LENGTH := 10
0000021C 2                ELSE (* Non-real-time *)
0000021C 2                  MSG_LENGTH := 12;
00000222 2          PRCSS_MSG_TBL [ MSG_NO ]^.LENGTH := MSG_LENGTH
00000238 2        END; (* Put out appropriate running message *)
00000238 2
00000238 2    (* Now, put in real-time/non-real-time string *)
00000238 2    IF RT_FLAG = TRUE
00000244 2      THEN (* Real-time measurement *)
00000244 2        TYPE_NO := 14
0000024E 2      ELSE (* Non-real-time *)
0000024E 2        TYPE_NO := 15;
00000254 2    FOR I := 1 TO 7 DO
0000025A 2      PRCSS_MSG_TBL [ MSG_NO ]^.TEXT [ I+5 ] :=
0000025A 2           PRCSS_MSG_TBL [ TYPE_NO ]^.TEXT [ I ];
000002AA 2
000002AA 2    (* Finally put the message up *)
000002AA 2    P_MESSAGE ( PRCSS_MSG_TBL [ MSG_NO ], CLR_STATUS_MSG )
000002C3 2  END; (* Procedure RUN_MSG *)
00000000 1  $GLOBPROC OFF$
00000000 1
00000000 1
00000000 1
00000000 1
```

```
00000000  1
00000000  1  (*
00000000  1                          **********************
00000000  1                          ***** UNLOAD_MSG *****
00000000  1                          **********************
00000000  1                                                                  *)
00000000  1  $GLOBPROC ON$
00000000  1  PROCEDURE UNLOAD_MSG ( STATE:  S_INT );
00000000  2  (*
00000000  2    Procedure UNLOAD_MSG to update the current unload message with the
00000000  2    given count.  A message is only output when STATE MOD X is 0, where
00000000  2    X is defined in the code.
00000000  2
00000000  2    UNLOAD_MSG uses the following routines:  FORMAT and P_MESSAGE.
00000000  2
00000000  2    Input:  1) STATE, the state currently being unloaded
00000000  2    Output:  none
00000000  2
00000000  2                                                                  *)
00000000  2  VAR
00000000  2
00000000  2    FORMAT_SIZE:  S_INT; (* Returned size from FORMAT *)
00000002  2
00000002  2    OUT_STATE:  S_INT; (* # to be output in message *)
000002D0  2
000002D0  2  BEGIN (* Procedure UNLOAD_MSG *)
000002D0  2    IF STATE MOD 64 = 0
000002E8  2      THEN (* This is the 64th, 128th, etc. state *)
000002E8  2        BEGIN (* Output unloading message *)
000002E8  2          FORMAT_SIZE := 4;
000002EE  2          OUT_STATE := STATE * 2; (* Output byte count *)
000002FA  2          FORMAT ( FALSE, OUT_STATE, 2, PRCSS_MSG_TBL [ 4 ]^.TEXT [ 20 ],
000002FA  2                   FORMAT_SIZE, 10, -1 );
00000326  2          P_MESSAGE ( PRCSS_MSG_TBL [ 4 ], CLR_STATUS_MSG )
00000336  2        END (* Output unloading message *)
00000336  2  END; (* Procedure UNLOAD_MSG *)
00000000  1  $GLOBPROC OFF$
00000000  1
00000000  1
00000000  1
00000000  1
00000000  1
00000000  1  (*
00000000  1                          ********************
00000000  1                          ***** EXIT_MSG *****
00000000  1                          ********************
00000000  1                                                                  *)
00000000  1  $GLOBPROC ON$
00000000  1  PROCEDURE EXIT_MSG ( CODE, RECS:  S_INT );
00000000  2  (*
00000000  2    Procedure EXIT_MSG to put up the appropriate final status/error
00000000  2    message.
00000000  2
00000000  2    EXIT_MSG uses the following routines:  FORMAT, P_MESSAGE, F_FILE_ERR,
00000000  2    M_FILE_ERR, and EMUL_MSG.
00000000  2
00000000  2    Input:  1) CODE, the code specifying what error message, if any, is
00000000  2               to be output:
00000000  2               = -100 indicates error but no message
00000000  2               = -99 to -1 indicates dynamic controller error message
00000000  2               = 0 indicates no error and no message
00000000  2               = 1 to 9 indicates file manager error message
00000000  2               = 14 indicates halted status message
00000000  2               = 15 indicates completed status message
00000000  2               = 16 indicates stopped status message
00000000  2            2) RECS, the number of data records created
00000000  2    Output:  none
00000000  2                                                                  *)
00000000  2  VAR
00000000  2
00000000  2    FORMAT_SIZE:  S_INT; (* Returned size from FORMAT *)
00000002  2
00000002  2    MSG_NO:  S_INT; (* # of message to output *)
00000004  2
```

```
00000004  2     MSG_LENGTH:  S_INT; (* Length of message to output *)
00000006  2
00000006  2     TYPE_NO:  S_INT; (* Type # of message to be output:  hlt vs. cmplt *)
00000008  2
00000008  2     OUT_STATE:  S_INT; (* # to be output in message *)
0000000A  2
0000000A  2     I:  S_INT; (* FOR loop index *)
0000033E  2
0000033E  2   BEGIN (* Procedure EXIT_MSG *)
0000033E  2     IF ( CODE < 0 ) AND ( CODE <> QUIET_ERROR )
0000035C  2       THEN (* Some emulation or controller error occurred *)
0000035C  2         IF CODE = EMUL_PROBLEM
00000364  2           THEN (* Emulation error:  have emulation output the message *)
00000364  2             EMUL_MSG ( TRUE )
00000374  2           ELSE (* I should output the error message *)
00000374  2             P_MESSAGE ( PRCSS_MSG_TBL [ CODE ], CLR_ERROR_MSG );
00000392  2     IF CODE > 0
0000039A  2       THEN (* Some file manager error occurred or all done *)
0000039A  2         IF CODE < 10
000003A6  2           THEN (* File mgr error *)
000003A6  2             IF DEBUG_FLAG = DEBUG_FOOTDC
000003B2  2               THEN (* Trace file error *)
000003B2  2                 P_FILE_ERR ( FOOTDC_INFO.DCB, CODE )
000003C4  2               ELSE (* Trace memory error *)
000003C4  2                 M_FILE_ERR ( FOOTDC_INFO.DCB, CODE )
000003D8  2           ELSE (* We finished *)
000003D8  2             BEGIN (* Output final message from Dynamic Controller *)
000003D8  2               FORMAT_SIZE := 4;
000003DE  2               MSG_NO := 5;
000003E4  2               CASE CODE OF
000003EE  2                 15:  (* Measurement completed *)
000003EE  2                   BEGIN (* Output completed message *)
000003EE  2                     TYPE_NO := 12;
000003F4  2                     MSG_LENGTH := 18
000003FA  2                   END; (* Output completed message *)
000003FE  2                 16:  (* Measurement was stopped *)
000003FE  2                   BEGIN (* Output completed message with stop *)
000003FE  2                     TYPE_NO := 12;
00000404  2                     MSG_LENGTH := 30
0000040A  2                   END; (* Output completed message with stop *)
0000040E  2                 OTHERWISE  (* 14:  measurement was halted *)
0000040E  2                   BEGIN (* Output halted message *)
0000040E  2                     TYPE_NO := 13;
00000414  2                     MSG_LENGTH := 18
0000041A  2                   END (* Output halted message *)
0000041A  2               END; (* Of case statement *)
00000442  2               OUT_STATE := RECS * 2; (* Output byte count *)
0000044E  2               FORMAT ( FALSE, OUT_STATE, 2, PRCSS_MSG_TBL [ MSG_NO ]^.
0000044E  2                        TEXT [ 16 ], FORMAT_SIZE, 10, -1 );
00000488  2               PRCSS_MSG_TBL [ MSG_NO ]^.LENGTH := MSG_LENGTH;
0000049E  2
0000049E  2               (* Now, put in halted/completed string *)
0000049E  2               FOR I := 1 TO 5 DO
000004A4  2                 PRCSS_MSG_TBL [ MSG_NO ]^.TEXT [ I+5 ] :=
000004A4  2                      PRCSS_MSG_TBL [ TYPE_NO ]^.TEXT [ I ];
000004F4  2
000004F4  2               (* Finally, put the message up *)
000004F4  2               P_MESSAGE ( PRCSS_MSG_TBL [ MSG_NO ], CLR_FINAL_MSG )
00000512  2             END (* Output final message from Dynamic Controller *)
00000512  2   END; (* Procedure EXIT_MSG *)
00000000  1   $GLOBPROC OFF$
00000000  1   .

508: Warning: field or entry alignment; record or array comparisons may not work

End of compilation, number of errors=     0
00000000  1   "68000" PREPROCESS
00000000  1   $EXTENSIONS ON$
00000000  1   $TITLE "Soda Dynamic/Static Controller Pascal Utils #1"
00000000  1   PROGRAM PAS_UTL1;
00000000  1   (*
```

```
00000000 1  ******************************** PAS_UTL1 **********************************
00000000 1   PAS_UTL1 is a module containing Pascal support routines necessary for
00000000 1   the Dynamic and Static Controllers.  In effect, these are "library"
00000000 1   routines used by different aspects of the Controllers.  See also
00000000 1   PAS_UTL2.  PAS_UTL1 is processor independent.
00000000 1   Author:  Kip Fulghum
00000000 1   Date:  9-20-82  Revised:  1-8-85
00000000 1  ******************************************************************************
00000000 1
00000000 1   PAS_UTL1 contains the following routines:
00000000 1   -Global function FIND_MEAS returns the index of the record in the
00000000 1    user measurement structure describing the type of measurement.
00000000 1   -Global procedure WRITE_CNTRL_WRD writes the indicated control word
00000000 1    out to its designated location in memory.
00000000 1   -Global procedure READ_FLAG_WRD reads the indicated system flag out
00000000 1    of its designated location in memory.
00000000 1   -Global function TEST_FEATURE tests to see if a given feature is
00000000 1    turned on or not.
00000000 1   -Global function CLASSIFY_BREAK determines what caused the hardware
00000000 1    to break.
00000000 1   -Global function CLASS_VAR_DATA determines what type of variable data
00000000 1    is contained in the current hardware sextet based on the captured
00000000 1    flags.
00000000 1   -Global procedure HOW_MUCH_DATA determines how much data was captured
00000000 1    and starting from where.
00000000 1   -Procedure INIT_COUNT computes the starting base for the time/state
00000000 1    counter.
00000000 1   -Procedure DECODE_COUNT decodes the grey-code count in the given
00000000 1    sextet into an equivalent binary count.
00000000 1   -Global procedure GET_DATA retrieves a sextet worth of data out of
00000000 1    acquisition memory, translates the emulation data to generic data,
00000000 1    and decodes the captured grey-code count.
00000000 1   -Global function DISABLE_CHECK checks for the final disable condition.
00000000 1
00000000 1   In addition, the following external procedures and functions are
00000000 1   used:  EMUL_STATUS, GET_SEXTET, ADD_64, SUB_64, GREY_BIN,
00000000 1   ADJUST_SEXTET, and P_ADDR.
00000000 1                                                                        *)
00000000 1  (*
00000000 1                        **************************
00000000 1                        ***** Include Files *****
00000000 1                        **************************
00000000 1                                                                        *)
00000000 1
00000000 1  #INCLUDE COM_TYPES:SS_DYN
00000000 1
00000000 1  #INCLUDE LD_TYPES:SS_DYN
00000000 1
00000000 1  #INCLUDE UNLD_TYPES:SS_DYN
00000000 1
00000000 1  #INCLUDE ICMD_DATA:SODAMON
00000000 1
00000000 1  CONST
00000000 1
00000000 1  (*
00000000 1                  ******************************************
00000000 1                  ***** Control Word/Byte Locations *****
00000000 1                  ******************************************
00000000 1                                                                        *)
00000000 1
00000000 1   SYS_CONTROL_1 = 416000H; (* Memory adrs of sys control word # 1 *)
00000000 1
00000000 1   SYS_CONTROL_2 = 418000H; (* Memory adrs of sys control word # 2 *)
00000000 1
00000000 1   SYS_RESET     = 41A000H; (* Memory adrs of system reset *)
00000000 1
00000000 1   SYS_CON_BYTE  = 80E000H; (* Memory adrs of sys control byte *)
00000000 1
00000000 1   SYS_ACQ_BYTE  = 210070H; (* Memory adrs of sys acq byte *)
00000000 1
00000000 1   SYS_FLAG_1    = 416000H; (* Memory adrs of system flag # 1 *)
00000000 1
00000000 1   SYS_FLAG_2    = 418000H; (* Memory adrs of system flag # 2 *)
00000000 1
```

```
00000000 1   SYS_FLAG_3    = 41A00CH; (* Memory adrs of system flag # 3 *)
00000000 1
00000000 1
00000000 1
00000000 1
00000000 1
00000000 1  $CALL_ABS_LONGS
00000000 1  (*
00000000 1                          *************************
00000000 1                          ***** EMUL_STATUS *****
00000000 1                          *************************
00000000 1                                                                         *)
00000000 1  PROCEDURE EMUL_STATUS ( NUM_TRIES:  S_INT; VAR STATUS_CODE:  S_INT );
00000000 2                          EXTERNAL;
00000000 1  (*
00000000 1    Procedure EMUL_STATUS to see if the emulation monitor is out there
00000000 1    in emulation land.  Provided as part of the message handler.
00000000 1                                                                         *)
00000000 1
00000000 1
00000000 1
00000000 1
00000000 1
00000000 1  $CALL_PC_SHORTS
00000000 1  (*
00000000 1                          ************************
00000000 1                          ***** GET_SEXTET *****
00000000 1                          ************************
00000000 1                                                                         *)
00000000 1  PROCEDURE GET_SEXTET ( N_COUNT:  S_INT;  VAR SEXTET:  SEXTET_REC_TYPE );
00000000 2                         EXTERNAL;
00000000 1  (*
00000000 1    Procedure GET_SEXTET to retrieve the indicated hardware data sextet
00000000 1    consisting of PC, address, grey-code time/state count, emulation
00000000 1    data, emulation status, and hardware flags from the hardware.
00000000 1    Provided as an assembly language external.
00000000 1                                                                         *)
00000000 1
00000000 1
00000000 1
00000000 1
00000000 1
00000000 1
00000000 1  (*
00000000 1                          ******************
00000000 1                          ***** ADD_64 *****
00000000 1                          ******************
00000000 1                                                                         *)
00000000 1  PROCEDURE ADD_64 ( VAR ADDEND_1, ADDEND_2, ANSWER:  DOUBLE_ARRAY );
00000000 2                     EXTERNAL;
00000000 1  (*
00000000 1    Procedure ADD_64 to do a double add, ie add two 64 bit quantities
00000000 1    to come up with a 64 bit quantity.  Provided as an assembly
00000000 1    language external.
00000000 1                                                                         *)
00000000 1
00000000 1
00000000 1
00000000 1
00000000 1
00000000 1  (*
00000000 1                          ******************
00000000 1                          ***** SUB_64 *****
00000000 1                          ******************
00000000 1                                                                         *)
00000000 1  PROCEDURE SUB_64 ( VAR MINUEND, SUBTRAHEND, ANSWER:  DOUBLE_ARRAY );
00000000 2                     EXTERNAL;
00000000 1  (*
00000000 1    Procedure SUB_64 to do a double subtract, ie subtract one 64 bit
00000000 1    quantity from another to come up with a 64 bit quantity.  Provided as
00000000 1    an assembly language external.
00000000 1                                                                         *)
00000000 1
00000000 1
```

```
00000000  1
00000000  1
00000000  1
00000000  1  (*
00000000  1                        *********************
00000000  1                        ***** GREY_BIN *****
00000000  1                        *********************
00000000  1                                                          *)
00000000  1  PROCEDURE GREY_BIN ( GREY:  L_INT; VAR BINARY:  DOUBLE_ARRAY; VAR
00000000  2                    RESET:  BOOLEAN ); EXTERNAL;
00000000  1  (*
00000000  1    Procedure GREY_BIN to convert a grey-code count into an ordinary
00000000  1    binary count.  Provided as an assembly language external.
00000000  1                                                          *)
00000000  1
00000000  1
00000000  1
00000000  1
00000000  1
00000000  1  (*
00000000  1                     **************************
00000000  1                     ***** ADJUST_SEXTET *****
00000000  1                     **************************
00000000  1                                                          *)
00000000  1  PROCEDURE ADJUST_SEXTET ( VAR SEXTET:  SEXTET_REC_TYPE ); EXTERNAL;
00000000  1  (*
00000000  1    Procedure ADJUST_SEXTET to convert a sextet of captured, processor
00000000  1    dependent data into its generic equivalent.  Provided as a Pascal
00000000  1    external.
00000000  1                                                          *)
00000000  1
00000000  1
00000000  1
00000000  1
00000000  1
00000000  1  (*
00000000  1                        ******************
00000000  1                        ***** P_ADDR *****
00000000  1                        ******************
00000000  1                                                          *)
00000000  1  PROCEDURE P_ADDR ( LOGICAL_ADDR:  L_INT; VAR PHYSICAL_ADDR:  L_INT );
00000000  2                    EXTERNAL;
00000000  1  (*
00000000  1    Procedure P_ADDR to return the physical address equivalent of the
00000000  1    given logical address.  Provided as a Pascal external.
00000000  1                                                          *)
00000000  1
00000000  1
00000000  1
00000000  1
00000000  1
00000000  1  (*
00000000  1                        *********************
00000000  1                        ***** FIND_MEAS *****
00000000  1                        *********************
00000000  1                                                          *)
00000000  1  $GLOBPROC ON$
00000000  1  FUNCTION FIND_MEAS ( VAR MEAS_STRUCT:  CMD_DATA_ARRAY ):  S_INT;
00000002  2  (*
00000002  2    Function FIND_MEAS to return the index of the record in the user
00000002  2    measurement structure describing the type of measurement.  The first
00000002  2    measurement indicator found will be returned, ie no check is made
00000002  2    for more than one.
00000002  2
00000002  2    Input:  1) MEAS_STRUCT, the structure describing the measurement at
00000002  2               a high level
00000002  2    Output:  1) index into MEAS_STRUCT of type of measurement record,
00000002  2                in function name, or:
00000002  2                  -1 indicates no measurement indicator found
00000002  2                                                          *)
00000002  2  VAR
00000002  2
00000002  2    I:  S_INT; (* WHILE loop index *)
00000004  2
```

```
00000004 2    MEAS_INDEX:  S_INT; (* Index into structure of measurement
00000004 2                              indicator *)
00000004 2
00000004 2  BEGIN (* Function FIND_MEAS *)
00000004 2    I := 0; (* Start at the beginning - a good place to start *)
00000008 2    MEAS_INDEX := -1; (* Set index to indicate nothing found *)
0000000E 2    WHILE ( MEAS_STRUCT [ I ].OP_CODE <> EOL ) AND ( MEAS_INDEX = -1 ) DO
0000003C 2      BEGIN (* Find type of measurement *)
0000003C 2        IF MEAS_STRUCT [ I ].OP_CODE < COMMAND
00000050 2          THEN (* Found measurement type *)
00000050 2            MEAS_INDEX := I;
00000056 2        I := I + 1
0000005A 2      END; (* Find type of measurement *)
0000005C 2    FIND_MEAS := MEAS_INDEX (* Assign function value *)
00000062 2  END; (* Function FIND_MEAS *)
00000000 1  $GLOBPROC OFF$
00000000 1
00000000 1
00000000 1
00000000 1
00000000 1
00000000 1  (*
00000000 1                      *****************************
00000000 1                      ***** WRITE_CNTRL_WRD *****
00000000 1                      *****************************
00000000 1                                                                  *)
00000000 1  $GLOBPROC ON$
00000000 1  PROCEDURE WRITE_CNTRL_WRD ( TYPE_WORD:  CNTRLLR_TYPES; CONTROL_VALUE:
00000000 2                               L_INT );
00000000 2  (*
00000000 2    Procedure WRITE_CNTRL_WRD to write the indicated control word out to
00000000 2    its designated location in memory.  Procedure will do any type
00000000 2    changing necessary to output the correct length control word.
00000000 2
00000000 2    Input:  1) TYPE_WORD, the indicator as to which control word is to
00000000 2               be output
00000000 2            2) CONTROL_VALUE, the actual value to be output to the
00000000 2               indicated control word
00000000 2    Output:  none ( control board/memory board memory written to )
00000000 2                                                                  *)
00000000 2  VAR
00000000 2
00000000 2    TEMP_PTR:  S_INT_PTR; (* Pointer to control word *)
00000070 2
00000070 2  BEGIN (* Procedure WRITE_CNTRL_WRD *)
00000070 2    CASE TYPE_WORD OF
0000007A 2      CONTROL_1:  (* Want to write out control word # 1 *)
0000007A 2        TEMP_PTR := S_INT_PTR ( SYS_CONTROL_1 );
00000086 2      CONTROL_2:  (* Want to write out control word # 2 *)
00000086 2        TEMP_PTR := S_INT_PTR ( SYS_CONTROL_2 );
00000092 2      CONTROL_BYTE:  (* Want to write out control byte *)
00000092 2        TEMP_PTR := S_INT_PTR ( SYS_CON_BYTE );
0000009E 2      ACQ_BYTE:  (* Want to write out acquisition byte *)
0000009E 2        TEMP_PTR := S_INT_PTR ( SYS_ACQ_BYTE );
000000AA 2      OTHERWISE (* Want to write out control reset *)
000000AA 2        TEMP_PTR := S_INT_PTR ( SYS_RESET )
000000B2 2    END; (* Of case statement *)
000000DA 2    (* Write word out to control location *)
000000DA 2    TEMP_PTR^ := S_INT ( CONTROL_VALUE )
000000E4 2  END; (* Procedure WRITE_CNTRL_WRD *)
00000000 1  $GLOBPROC OFF$
00000000 1
00000000 1
00000000 1
00000000 1
00000000 1
00000000 1  (*
00000000 1                      **************************
00000000 1                      ***** READ_FLAG_WRD *****
00000000 1                      **************************
00000000 1                                                                  *)
00000000 1  $GLOBPROC ON$
00000000 1  PROCEDURE READ_FLAG_WRD ( TYPE_WORD:  FLAG_TYPES; VAR FLAG_VALUE:
00000000 2                               S_INT );
```

```
00000000  2  (*
00000000  2    Procedure READ_FLAG_WRD to read the indicated system flag word out
00000000  2    of its designated location in memory.  Procedure simply returns the
00000000  2    flag word to the caller.
00000000  2
00000000  2    Input:  1) TYPE_WORD, the flag to be read
00000000  2    Output:  1) FLAG_VALUE, the indicated system flag word
00000000  2                                                                      *)
00000000  2  VAR
00000000  2
00000000  2    TEMP_PTR:  S_INT_PTR; (* Pointer to flag word *)
000000EC  2
000000EC  2  BEGIN (* Procedure READ_FLAG_WRD *)
000000EC  2    CASE TYPE_WORD OF
000000F6  2      FLAG_1:  (* Want to read in flag word # 1 *)
000000F6  2        TEMP_PTR := S_INT_PTR ( SYS_FLAG_1 );
00000102  2      FLAG_2:  (* Want to read in flag word # 2 *)
00000102  2        TEMP_PTR := S_INT_PTR ( SYS_FLAG_2 );
0000010E  2      OTHERWISE (* Want to read in flag word # 3 *)
0000010E  2        TEMP_PTR := S_INT_PTR ( SYS_FLAG_3 )
00000116  2    END; (* Of case statement *)
00000138  2    (* Read word from flag location *)
00000138  2    FLAG_VALUE := TEMP_PTR^
00000142  2  END; (* Procedure READ_FLAG_WRD *)
00000000  1  $GLOBPROC OFF$
00000000  1
00000000  1
00000000  1
00000000  1
00000000  1
00000000  1  (*
00000000  1                         **************************
00000000  1                         ***** TEST_FEATURE *****
00000000  1                         **************************
00000000  1                                                                      *)
00000000  1  $GLOBPROC ON$
00000000  1  FUNCTION TEST_FEATURE ( VAR FEAT_SIG:  FEATURE_REC ):  CONDITION_TYPE;
0000014A  2  (*
0000014A  2    Function TEST_FEATURE to test to see if a given feature is turned
0000014A  2    on or not.
0000014A  2
0000014A  2    Input:  1) FEAT_SIG, a record describing the feature signal
0000014A  2    Output:  1) a flag indicating if the signal is turned ON or OFF
0000014A  2                                                                      *)
0000014A  2  BEGIN (* Procedure TEST_FEATURE *)
0000014A  2    TEST_FEATURE := FEAT_SIG.STATUS.CONDITION
00000154  2  END; (* Procedure TEST_FEATURE *)
00000000  1  $GLOBPROC OFF$
00000000  1
00000000  1
00000000  1
00000000  1
00000000  1
00000000  1  (*
00000000  1                         ****************************
00000000  1                         ***** CLASSIFY_BREAK *****
00000000  1                         ****************************
00000000  1                                                                      *)
00000000  1  $GLOBPROC ON$
00000000  1  FUNCTION CLASSIFY_BREAK ( VAR FLAGS:  FLAG_ARRAY_TYPE; VAR FEAT_ARRAY:
00000000  2                           FEAT_ARRAY_TYPE ):  S_INT;
00000002  2  (*
00000002  2    Function CLASSIFY_BREAK to determine what caused the hardware to
00000002  2    break, then return the cause to the caller.  Function uses hardware
00000002  2    flags and the memory mode to guess as to why the hardware stopped.
00000002  2
00000002  2    CLASSIFY_BREAK uses the following routines:  EMUL_STATUS and
00000002  2    TEST_FEATURE.
00000002  2
00000002  2    Note:  this routine was written for non-real-time breaks.  It may
00000002  2           halt the emulator to check its status!
00000002  2
```

```
00000002  2    Input:  1) FLAGS, the most recenty read hardware flags
00000002  2            2) FEAT_ARRAY, the feature array containing the current status
00000002  2               of stop on memory full
00000002  2    Output:  1) cause of the break, in function name:
00000002  2                  -1 indicates halted/emulator not in monitor,
00000002  2                   0 indicates stopped on memory full ( no wrap ),
00000002  2                   1 indicates stopped on sequence stopping condition,
00000002  2                   2 indicates stopped for some measurement reason
00000002  2                                                                    *)
00000002  2  VAR
00000002  2
00000002  2    EMUL_CODE:  S_INT; (* Return code from emulation *)
00000162  2
00000162  2  BEGIN (* Function CLASSIFY_BREAK *)
00000162  2    IF ( STOP_BIT IN FLAG_1_SET ( FLAGS [ FLAG_1 ] ) ) AND
00000162  2       ( TEST_FEATURE ( FEAT_ARRAY [ BREAK_ON_STOP ] ) = ON )
00000194  2      THEN (* Hardware has stopped and we issued break *)
00000194  2        EMUL_STATUS ( -128, EMUL_CODE ) (* Check emulator *)
000001A8  2      ELSE (* Hardware didn't stop or we did not issue break *)
000001A8  2        EMUL_CODE := 1; (* Assume emulator is still running *)
000001AE  2
000001AE  2    IF EMUL_CODE = 0
000001B6  2      THEN (* I stopped the hardware internally and we're in monitor *)
000001B6  2        IF NOT ( MEM_NOT_FULL_BIT IN FLAG_1_SET ( FLAGS [ FLAG_1 ] ) ) AND
000001B6  2           ( TEST_FEATURE ( FEAT_ARRAY [ STOP_MEM_FULL ] ) = ON )
000001EC  2          THEN (* I stopped on memory full *)
000001EC  2            CLASSIFY_BREAK := 0
000001F4  2          ELSE (* No stop on memory full *)
000001F4  2            IF NOT ( NOT_SEQ_STOP IN FLAG_2_SET ( FLAGS [ FLAG_2 ] ) )
0000020C  2              THEN (* I found a sequence stopping condition *)
0000020C  2                CLASSIFY_BREAK := 1
00000216  2              ELSE (* No stopping condition either *)
00000216  2                CLASSIFY_BREAK := 2 (* Must have stopped for the msrmnt *)
00000220  2      ELSE (* Hardware was stopped externally or not in monitor *)
00000220  2        CLASSIFY_BREAK := -1
00000226  2  END; (* Function CLASSIFY_BREAK *)
00000000  1  $GLOBPROC OFF$
00000000  1
00000000  1
00000000  1
00000000  1
00000000  1
00000000  1  (*
00000000  1                          ****************************
00000000  1                          ***** CLASS_VAR_DATA *****
00000000  1                          ****************************
00000000  1                                                                    *)
00000000  1  $GLOBPROC ON$
00000000  1  FUNCTION CLASS_VAR_DATA ( FLAGS:  FLAG_SET ):  S_INT;
00000234  2  (*
00000234  2    Function CLASS_VAR_DATA to determine what type of variable data
00000234  2    is contained in the current hardware sextet based on the hardware
00000234  2    flags.  First, it is checked to see if the fast sequencer caused the
00000234  2    store.  If not, static.  If so, the FSR_X and FSR_Y flags are checked.
00000234  2    If either is set, stack address, else dynamic ( the default ).
00000234  2
00000234  2    Input:  1) FLAGS, the stored hardware flags
00000234  2    Output:  1) the type of data, in function name:
00000234  2                 -2 indicates a stack address ( for dynamic variables ),
00000234  2                  1 indicates static variable,
00000234  2                  2 indicates dynamic variable ( default )
00000234  2                                                                    *)
00000234  2  BEGIN (* Function CLASS_VAR_DATA *)
00000234  2    IF NORMAL_STORE IN FLAGS
0000023E  2      THEN (* This must be a static variable *)
0000023E  2        CLASS_VAR_DATA := STATIC_VAR
00000248  2      ELSE (* This must be a stack address or dynamic variable *)
00000248  2        IF ( FSR_X IN FLAGS ) OR ( FSR_Y IN FLAGS )
00000266  2          THEN (* This data contains stack address *)
00000266  2            CLASS_VAR_DATA := STACK_ADRS
00000270  2          ELSE (* This data contains a dynamic variable *)
00000270  2            CLASS_VAR_DATA := DYNAMIC_VAR
00000276  2  END; (* Function CLASS_VAR_DATA *)
00000000  1  $GLOBPROC OFF$
```

```
00000000  1
00000000  1
00000000  1
00000000  1
00000000  1
00000000  1  (*
00000000  1                     ***************************
00000000  1                     ***** HOW_MUCH_DATA *****
00000000  1                     ***************************
00000000  1                                                                    *)
00000000  1  $GLOBPROC ON$
00000000  1  PROCEDURE HOW_MUCH_DATA ( VAR FLAGS:  FLAG_ARRAY_TYPE; VAR FEAT_ARRAY:
00000000  2                          FEAT_ARRAY_TYPE; START_MAC, END_MAC:  S_INT;
00000000  2                          VAR START_STATE, NUM_STATES:  S_INT );
00000284  2  (*
00000284  2    Procedure HOW_MUCH_DATA to determine how much data was captured and
00000284  2    starting from where.  Procedure checks the memory full flag and the
00000284  2    starting and ending memory address counters to determine how much
00000284  2    data has been captured.
00000284  2
00000284  2    HOW_MUCH_DATA handles memory wrapping with the greatest of ease!
00000284  2
00000284  2    HOW_MUCH_DATA uses the following routine:  TEST_FEATURE.
00000284  2
00000284  2    Input:  1) FLAGS, the flag word data structure containing the most
00000284  2               up-to-date hardware flags
00000284  2            2) FEAT_ARRAY, the feature array containing the current status
00000284  2               of stop on memory full
00000284  2            3) START_MAC, the starting memory address counter
00000284  2            4) END_MAC, the ending memory address counter
00000284  2    Output:  1) START_STATE, the # of the first captured state
00000284  2             2) NUM_STATES, the total # of captured states
00000284  2                                                                    *)
00000284  2  BEGIN (* Procedure HOW_MUCH_DATA *)
00000284  2    IF MEM_NOT_FULL_BIT IN FLAG_1_SET ( FLAGS [ FLAG_1 ] )
00000290  2      THEN (* Memory is not full *)
00000290  2        BEGIN (* Unload up to last state starting at first state *)
00000290  2          START_STATE := START_MAC;
00000298  2          NUM_STATES := END_MAC - START_MAC
000002A6  2        END (* Unload up to last state starting at first state *)
000002AA  2      ELSE (* Memory is full *)
000002AA  2        BEGIN (* Unload 4095 states starting at the right location *)
000002AA  2          IF TEST_FEATURE ( FEAT_ARRAY [ STOP_MEM_FULL ] ) = ON
000002BE  2            THEN (* Stop on memory full *)
000002BE  2              START_STATE := START_MAC
000002CA  2            ELSE (* Wrap mode *)
000002CA  2              START_STATE := ( END_MAC+1) MOD 4096;
000002E4  2          NUM_STATES := 4095 (* Ignore last acquisition *)
000002EC  2        END (* Unload 4095 states starting at the right location *)
000002EC  2  END; (* Procedure HOW_MUCH_DATA *)
00000000  1  $GLOBPROC OFF$
00000000  1
00000000  1
00000000  1
00000000  1
00000000  1
00000000  1  (*
00000000  1                     ***********************
00000000  1                     ***** INIT_COUNT *****
00000000  1                     ***********************
00000000  1                                                                    *)
00000000  1  PROCEDURE INIT_COUNT ( INITIAL_GREY:  L_INT; VAR START_BASE:
00000000  2                         DOUBLE_ARRAY );
00000000  2  (*
00000000  2    Procedure INIT_COUNT to compute the starting base for the time/state
00000000  2    counter.  Procedure decodes the given grey-code count, then negates
00000000  2    it to determine the starting base so first unloaded state will
00000000  2    have a count of 0.
00000000  2
00000000  2    INIT_COUNT uses the following routines:  GREY_BIN and SUB_64.
00000000  2
00000000  2    Input:  1) INITIAL_GREY, the initial grey-code count
00000000  2    Output:  1) START_BASE, the decoded, starting base
00000000  2                                                                    *)
```

```
00000000  2  VAR
00000000  2
00000000  2    NORM_COUNT:  DOUBLE_ARRAY; (* Storage for decoded count *)
00000008  2
00000008  2    RESET:  BOOLEAN; (* You guessed it *)
000002F4  2
000002F4  2  BEGIN (* Procedure INIT_COUNT *)
000002F4  2    (* Initialize current base counter for time/state count *)
000002F4  2    START_BASE [ 0 ] := 0;
000002FA  2    START_BASE [ 1 ] := 0;
00000302  2    GREY_BIN ( INITIAL_GREY, NORM_COUNT, RESET );
00000318  2    (* Negate first count for starting count base *)
00000318  2    SUB_64 ( START_BASE, NORM_COUNT, START_BASE )
00000332  2  END; (* Procedure INIT_COUNT *)
00000000  1
00000000  1
00000000  1
00000000  1
00000000  1
00000000  1  (*
00000000  1                          ************************
00000000  1                          ***** DECODE_COUNT *****
00000000  1                          ************************
00000000  1                                                                  *)
00000000  1  PROCEDURE DECODE_COUNT ( VAR SEXTET:  SEXTET_REC_TYPE; VAR FPC_SIG:
00000000  2                          FEATURE_REC; VAR BASE, NORM_COUNT:
00000000  2                          DOUBLE_ARRAY );
00000000  2  (*
00000000  2    Procedure DECODE_COUNT to decode the grey-code count in the given
00000000  2    sextet into an equivalent binary count.  Procedure firsts converts the
00000000  2    grey-code to binary and adds it to the current base, resulting in the
00000000  2    returned count.  If the grey-code counter was reset or we are counting
00000000  2    states, the current base is updated to the returned value as well.
00000000  2
00000000  2    DECODE_COUNT uses the following routines:  GREY_BIN, ADD_64, and
00000000  2    TEST_FEATURE.
00000000  2
00000000  2    Input:  1) SEXTET, the sextet with the grey-code count to be converted
00000000  2            2) FPC_SIG, the record describing the condition of the FP
00000000  2               counter
00000000  2            3) BASE, the current base to which the converted grey-code is
00000000  2               to be added
00000000  2    Output:  1) BASE, the new base for following grey codes
00000000  2             2) NORM_COUNT, the binary equivalent of the converted grey-
00000000  2                code plus the binary base
00000000  2                                                                  *)
00000000  2  VAR
00000000  2
00000000  2    ONE:  DOUBLE_ARRAY; (* Array used for storing 1 for incrementing *)
00000008  2
00000008  2    RESET:  BOOLEAN; (* Flag indicating grey-code counter reset:  time
0000033A  2                       to changes bases *)
0000033A  2
0000033A  2  BEGIN  (* Procedure DECODE_COUNT *)
0000033A  2    ONE [ 0 ] := 0;
0000033E  2    ONE [ 1 ] := 1;
00000346  2    GREY_BIN ( SEXTET.COUNT [ 0 ], NORM_COUNT, RESET ); (* Convert grey to
00000364  2                                                           binary *)
00000364  2    ADD_64 ( BASE, NORM_COUNT, NORM_COUNT ); (* Add in base *)
00000380  2    IF TEST_FEATURE ( FPC_SIG ) = OFF
00000394  2      THEN (* Counting states *)
00000394  2        BEGIN (* Do funny stuff because of hardware *)
00000394  2          IF FP_COUNT IN SEXTET.FLAGS
000003A2  2            THEN (* Count is off by one *)
000003A2  2              ADD_64 ( ONE, NORM_COUNT, NORM_COUNT );
000003BC  2          BASE := NORM_COUNT (* Always change bases *)
000003C8  2        END (* Do funny stuff because of hardware *)
000003CC  2      ELSE (* Counting time *)
000003CC  2        IF RESET = TRUE
000003D8  2          THEN (* Time to change bases *)
```

```
00000308  2           BEGIN (* Do some more funny stuff becaus
00000308  2             BASE := NORM_COUNT; (* Change bases *)
000003E4  2             ADD_64 ( ONE, BASE, BASE ) (* Correct !
000003FE  2           END (* Do some more funny stuff because c
000003FE  2  END;  (* Procedure DECODE_COUNT *)
00000000  1
00000000  1
00000000  1
00000000  1
00000000  1
00000000  1  (*
00000000  1                         ********************
00000000  1                         ***** GET_DATA *****
00000000  1                         ********************
00000000  1
00000000  1  $GLOBPROC ON$
00000000  1  PROCEDURE GET_DATA ( START_STATE, UN_COUNTER:  S_IN
00000000  2                     FEAT_ARRAY_TYPE; VAR BASE:  DO
00000000  2                     SEXTET:  SEXTET_REC_TYPE );
00000406  2  (*
00000406  2    Procedure GET_DATA to retrieve a sextet worth of
00000406  2    acquisition memory, translate the emulation data
00000406  2    and decode the captured grey-code count.  Procedu
00000406  2    indicated sextet from memory and changes it into
00000406  2    GET_DATA then checks to see if it is the first st
00000406  2    so, the initial base for the grey-code is determi
00000406  2    the grey-code is decoded to a straight binary cou.
00000406  2
00000406  2    GET_DATA handles wrapping, ie if the start state
00000406  2    for the 4096th acquired state, you will get state
00000406  2
00000406  2    GET_DATA uses the following routines:  GET_SEXTET.
00000406  2    DECODE_COUNT, and ADJUST_SEXTET.
00000406  2
00000406  2    Input:  1) START_STATE, the state # of the first s
00000406  2            2) UN_COUNTER, the acquired # of the curre
00000406  2               unloaded ( ie 1st state to be captured,
00000406  2            3) FEAT_ARRAY, the feature array containi
00000406  2               of the FP counter, ie whether it is co
00000406  2            4) BASE, the current base to which the cur
00000406  2               to be added
00000406  2    Output:  1) BASE, the new base for following grey
00000406  2             2) SEXTET, the UN_COUNTERth adjusted sext
00000406  2                in the hardware.  This includes generi
00000406  2                status, as well as binary time/state c
00000406  2                flags
00000406  2
00000406  2  BEGIN (* Procedure GET_DATA *)
00000406  2    (* Pull the sextet out of the hardware *)
00000406  2    GET_SEXTET ( ( ( START_STATE+UN_COUNTER-1 ) MOD 40
0000042C  2    (* Now, translate emulation data to generic data *
0000042C  2    ADJUST_SEXTET ( SEXTET );
00000438  2    IF UN_COUNTER = 1
00000444  2      THEN (* This is first state to be unloaded *)
00000444  2        (* Initialize current base counter for time/st
00000444  2        INIT_COUNT ( SEXTET.COUNT [ 0 ], BASE );
0000045A  2    (* Decode the grey-code count and put in absolute
0000045A  2    DECODE_COUNT ( SEXTET, FEAT_ARRAY [ FPC_TIME_MODE
0000045A  2                   SEXTET.COUNT )
00000480  2  END; (* Procedure GET_DATA *)
00000000  1  $GLOBPROC OFF$
00000000  1
00000000  1
00000000  1
00000000  1
00000000  1
00000000  1  (*
00000000  1                        ************************
00000000  1                        ***** DISABLE_CHECK *****
00000000  1                        ************************
00000000  1                                                          *)
00000000  1  $GLOBPROC ON$
00000000  1  FUNCTION DISABLE_CHECK ( VAR STOP_PTR:  CMD_ARRAY_PTR; VAR FLAGS:
00000000  2                         FLAG_ARRAY_TYPE; MAC:  S_INT; VAR TRACE_SPEC:
00000000  2                         TRACE_SPEC_REC ):  BOOLEAN;
00000001  2  (*
```

```
00000001  2    Function DISABLE_CHECK to check for the final disable condition.
00000001  2    Function first checks the hardware disable flag.  If set, we disabled.
00000001  2    If not and we stored something, that something is compared against all
00000001  2    the somethings in the last disable sequence state.  If a comparison
00000001  2    works, we're also disabled.
00000001  2
00000001  2    DISABLE_CHECK uses the following routines:  FIND_MEAS, GET_DATA, and
00000001  2    P_ADDR.
00000001  2
00000001  2    Input:  1) STOP_PTR, a pointer to the command array containing the
00000001  2               disable sequence specification
00000001  2            2) FLAGS, the array of flag words
00000001  2            3) MAC, the memory address counter
00000001  2            4) TRACE_SPEC, the current trace specification
00000001  2    Output:  1) a flag indicating if a disable condition occurred ( TRUE )
00000001  2                or not ( FALSE ), in function name
00000001  2                                                                        *)
00000001  2  VAR
00000001  2
00000001  2    I:  S_INT; (* Index into cmd stack of measurement/WHILE loop index *)
00000004  2
00000004  2    P_ADDRESS:  L_INT; (* Physical address *)
00000008  2
00000008  2    CURRENT_BASE:  DOUBLE_ARRAY; (* Storage for current base count *)
00000010  2
00000010  2    SEXTET_REC:  SEXTET_REC_TYPE; (* Storage for unloaded hw sextet *)
00000026  2
00000026  2    DISABLED:  BOOLEAN; (* Final disable flag *)
00000488  2
00000488  2  BEGIN (* Function DISABLE_CHECK *)
00000488  2    DISABLED := FALSE; (* Assume not disabled *)
0000048C  2
0000048C  2    IF NOT ( NOT_SEQ_STOP IN FLAG_2_SET ( FLAGS [ FLAG_2 ] ) )
000004A4  2      THEN (* Disable flag is set *)
000004A4  2        DISABLED := TRUE
000004AE  2      ELSE (* Disable flag is not set *)
000004AE  2        IF ( STOP_PTR <> NIL ) AND ( TRACE_SPEC.UN_REQUEST <> UN_ENABLES )
000004AE  2           AND ( STORE_BIT IN FLAG_1_SET ( FLAGS [ FLAG_1 ] ) )
000004E4  2          THEN (* There are disables, this is not an enable spec, and
000004E4  2                  last state was store qualified *)
000004E4  2            BEGIN (* Have software check for disable condition *)
000004E4  2              (* Note:  this software check of disables is only needed
000004E4  2                 for non-dequeued processors, ie the 68000.  If the
000004E4  2                 processor is broken by the measurement near a disable,
000004E4  2                 the disable is not seen because of pre-fetch! *)
000004E4  2              GET_DATA ( MAC-1, 1, TRACE_SPEC.HW_SPEC.FEATURES,
000004E4  2                         CURRENT_BASE, SEXTET_REC );
00000506  2              (* Find end of disable stack *)
00000506  2              I := FIND_MEAS ( STOP_PTR^ );
00000518  2              WHILE ( DISABLED = FALSE ) AND ( I >= 0 ) DO
00000536  2                WITH STOP_PTR^ [ I ] DO
0000054C  2                  BEGIN (* Check this address against the stored one *)
0000054C  2                    IF ( OP_CODE = PROC_OP ) OR ( OP_CODE = LINE_OP )
00000568  2                      THEN (* This is a possible disable case *)
00000568  2                        BEGIN (* Check it out *)
00000568  2                          IF OP_CODE = PROC_OP
00000570  2                            THEN (* Procedure *)
00000570  2                              IF STATUS = ON_ENTRY
0000057C  2                                THEN (* Check entry point *)
0000057C  2                                  P_ADDRESS := ENTRY
0000058A  2                                ELSE (* Check exit point *)
0000058A  2                                  P_ADDRESS := EXIT
00000598  2                            ELSE (* Line *)
00000598  2                              P_ADDRESS := ADDRESS;
000005A2  2                          (* Logical --> physical *)
000005A2  2                          P_ADDR ( P_ADDRESS, P_ADDRESS );
000005B0  2                          IF P_ADDRESS = SEXTET_REC.ADRS
000005BC  2                            THEN (* Disable found *)
000005BC  2                              DISABLED := TRUE
000005C2  2                        END; (* Check it out *)
000005C2  2                    IF OP_CODE = FOLLOWED_BY
000005D0  2                      THEN (* Found end of last state's disables *)
000005D0  2                        I := 0; (* Force our way out of loop *)
000005D4  2                    I := I - 1
000005D8  2                  END (* Check this address against the stored one *)
```

```
000005DC  2            END; (* Have software check for disable condition *)
000005DC  2
000005DC  2    DISABLE_CHECK := DISABLED (* Assign final function value *)
000005E2  2  END; (* Function DISABLE_CHECK *)
00000000  1  $GLOBPROC OFF$
00000000  1  .

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic/Static Controller Pascal Utils #2"
00000000  1  PROGRAM PAS_UTL2;
00000000  1  (*
00000000  1  ****************************** PAS_UTL2 ********************************
00000000  1    PAS_UTL2 is a module containing Pascal support routines necessary for
00000000  1    the Dynamic and Static Controllers.  In effect, these are "library"
00000000  1    routines used by different aspects of the Controllers.  See also
00000000  1    PAS_UTL1.  PAS_UTL2 is processor independent.
00000000  1    Author:  Kip Fulghum
00000000  1    Date:  9-20-82  Revised:  11-20-84
00000000  1  ************************************************************************
00000000  1
00000000  1    PAS_UTL2 contains the following routines:
00000000  1    -Global procedure PUSH_FRAME pushes the given frame onto the given
00000000  1     stack
00000000  1    -Global procedure POP_FRAME pops the next frame off the given stack.
00000000  1    -Global procedure PUSH_TIME pushes the given time onto the given
00000000  1     stack.
00000000  1    -Global procedure POP_TIME pops the next time off the given stack.
00000000  1    -Global procedure DIV_64 divides a 64 bit number by a 16 bit number.
00000000  1    -Global procedure COMPARE_64 compares two 64 bit numbers and returns
00000000  1     the smaller or larger of the two, whichever is requested.
00000000  1    -Global function UNLOAD_DONE determines when the unload sequence is
00000000  1     done.
00000000  1
00000000  1    In addition, the following external procedures and functions are
00000000  1    used:  SUB_64.
00000000  1                                                                        *)
00000000  1  (*
00000000  1                          ***************************
00000000  1                          ***** Include Files *****
00000000  1                          ***************************
00000000  1                                                                        *)
00000000  1
00000000  1  #INCLUDE COM_TYPES:SS_DYN
00000000  1
00000000  1  #INCLUDE UNLD_TYPES:SS_DYN
00000000  1
00000000  1  #INCLUDE ICHILDREN:SODAMON
00000000  1
00000000  1  VAR
00000000  1
00000000  1  $EXTVAR ON$
00000000  1
00000000  1    CARE_PACKAGE:  PARAMETER_PTR; (* Care package pointer from parent *)
00000000  1
00000000  1  $EXTVAR OFF$
00000000  1
00000000  1
00000000  1
00000000  1
00000000  1
00000000  1  (*
00000000  1                              *******************
00000000  1                              ***** SUB_64 *****
00000000  1                              *******************
00000000  1                                                                        *)
00000000  1  PROCEDURE SUB_64 ( VAR MINUEND, SUBTRAHEND, ANSWER:  DOUBLE_ARRAY );
00000000  2                    EXTERNAL;
00000000  1  (*
00000000  1    Procedure SUB_64 to do a double subtract, ie subtract one 64 bit
00000000  1    quantity from another to come up with a 64 bit quantity.  Provided as
00000000  1    an assembly language external.
00000000  1                                                                        *)
```

```
00000000  1
00000000  1
00000000  1
00000000  1
00000000  1
00000000  1  (*
00000000  1                        **********************
00000000  1                        ***** PUSH_FRAME *****
00000000  1                        **********************
00000000  1                                                                   *)
00000000  1  $GLOBPROC ON$
00000000  1  PROCEDURE PUSH_FRAME ( ENTRY:  FRAME_PTR_TYPE; VAR STACK:  FSTACK_TYPE;
00000000  2                       VAR TOP:  FSTACK_INDEX; VAR CODE:
00000000  2                       FSTACK_RETCODE );
00000004  2  (*
00000004  2    Procedure PUSH_FRAME to push the given frame onto the given stack.
00000004  2    PUSH_FRAME checks for stack overflow, then increments the index to
00000004  2    the top of the stack and pushes the frame on.
00000004  2
00000004  2    Input:  1) ENTRY, the entry to be pushed onto the stack
00000004  2            2) STACK, the stack onto which ENTRY is to be pushed
00000004  2            3) TOP, the current top of the stack
00000004  2    Output:  1) STACK, the stack with new entry on top
00000004  2             2) TOP, the new index to the top of the stack
00000004  2             3) CODE, a code specifying how the operation turned out:
00000004  2                 1 indicates no error:  operation completed
00000004  2                -1 indicates stack overflow
00000004  2                                                                   *)
00000004  2  BEGIN (* Procedure PUSH_FRAME *)
00000004  2    IF TOP >= MAX_FRAME_TOP
00000012  2      THEN (* The impossible has happened:  stack overflow *)
00000012  2        CODE := -1 (* Set code to indicate error *)
0000001E  2      ELSE (* Stack is alright:  not full *)
0000001E  2        BEGIN (* Increment top, then push entry onto stack *)
0000001E  2          TOP := TOP + 1;
00000028  2          STACK [ TOP ] := ENTRY;
0000003A  2          CODE := 1 (* Set code to indicate O.K. *)
00000042  2        END (* Increment top, then push entry onto stack *)
00000042  2  END; (* Procedure PUSH_FRAME *)
00000000  1  $GLOBPROC OFF$
00000000  1
00000000  1
00000000  1
00000000  1
00000000  1
00000000  1  (*
00000000  1                        *********************
00000000  1                        ***** POP_FRAME *****
00000000  1                        *********************
00000000  1                                                                   *)
00000000  1  $GLOBPROC ON$
00000000  1  PROCEDURE POP_FRAME ( VAR STACK:  FSTACK_TYPE; VAR TOP:  FSTACK_INDEX;
00000000  2                      VAR ENTRY:  FRAME_PTR_TYPE; VAR CODE:
00000000  2                      FSTACK_RETCODE );
0000004A  2  (*
0000004A  2    Procedure POP_FRAME to pop the next frame off the given stack.
0000004A  2    POP_FRAME checks for stack underflow, then pops the next frame off
0000004A  2    the stack and decrements the index to the top of the stack.
0000004A  2
0000004A  2    Input:  1) STACK, the stack from which ENTRY is to be popped
0000004A  2            2) TOP, the current top of the stack
0000004A  2    Output:  1) STACK, the stack with the entry popped off
0000004A  2             2) TOP, the new index to the top of the stack
0000004A  2             3) ENTRY, the entry which was popped from the stack
0000004A  2             4) CODE, a code specifying how the operation turned out:
0000004A  2                 1 indicates no error:  operation completed
0000004A  2                -1 indicates stack underflow
0000004A  2                                                                   *)
0000004A  2  BEGIN (* Procedure POP_FRAME *)
0000004A  2    IF TOP < 0
00000054  2      THEN (* The impossible has happened:  stack underflow *)
00000054  2        CODE := -1 (* Set code to indicate error *)
00000060  2      ELSE (* Stack is alright:  not empty *)
00000060  2        BEGIN (* Pop entry from stack, then decrement top *)
00000060  2          ENTRY := STACK [ TOP ];
```

```
00000074  2         TOP := TOP - 1;
0000007E  2         CODE := 1 (* Set code to indicate O.K. *)
00000086  2       END (* Pop entry from stack, then decrement top *)
00000086  2  END; (* Procedure POP_FRAME *)
00000000  1  $GLOBPROC OFF$
00000000  1
00000000  1
00000000  1
00000000  1
00000000  1
00000000  1  (*
00000000  1                        *********************
00000000  1                        ***** PUSH_TIME *****
00000000  1                        *********************
00000000  1                                                              *)
00000000  1  $GLOBPROC ON$
00000000  1  PROCEDURE PUSH_TIME ( ENTRY:  DOUBLE_ARRAY; VAR STACK:  TSTACK_TYPE;
00000000  2                        VAR TOP:  TSTACK_INDEX; VAR CODE:
00000000  2                        TSTACK_RETCODE );
0000009A  2  (*
0000009A  2    Procedure PUSH_TIME to push the given time onto the given stack.
0000009A  2    PUSH_TIME checks for stack overflow, then increments the index to
0000009A  2    the top of the stack and pushes the time on.
0000009A  2
0000009A  2    Input:  1) ENTRY, the entry to be pushed onto the stack
0000009A  2            2) STACK, the stack onto which ENTRY is to be pushed
0000009A  2            3) TOP, the current top of the stack
0000009A  2    Output:  1) STACK, the stack with new entry on top
0000009A  2             2) TOP, the new index to the top of the stack
0000009A  2             3) CODE, a code specifying how the operation turned out:
0000009A  2                   1 indicates no error:  operation completed
0000009A  2                  -1 indicates stack overflow
0000009A  2                                                              *)
0000009A  2  BEGIN (* Procedure PUSH_TIME *)
0000009A  2    IF TOP >= MAX_TIME_TOP
000000A8  2      THEN (* The impossible has happened:  stack overflow *)
000000A8  2        CODE := -1 (* Set code to indicate error *)
000000B4  2      ELSE (* Stack is alright:  not full *)
000000B4  2        BEGIN (* Increment top, then push entry onto stack *)
000000B4  2          TOP := TOP + 1;
000000BE  2          STACK [ TOP ] := ENTRY;
000000D6  2          CODE := 1 (* Set code to indicate O.K. *)
000000DE  2        END (* Increment top, then push entry onto stack *)
000000DE  2  END; (* Procedure PUSH_TIME *)
00000000  1  $GLOBPROC OFF$
00000000  1
00000000  1
00000000  1
00000000  1
00000000  1
00000000  1  (*
00000000  1                        *********************
00000000  1                        ***** POP_TIME *****
00000000  1                        *********************
00000000  1                                                              *)
00000000  1  $GLOBPROC ON$
00000000  1  PROCEDURE POP_TIME ( VAR STACK:  TSTACK_TYPE; VAR TOP:  TSTACK_INDEX;
00000000  2                       VAR ENTRY:  DOUBLE_ARRAY; VAR CODE:
00000000  2                       TSTACK_RETCODE );
000000E6  2  (*
000000E6  2    Procedure POP_TIME to pop the next time off the given stack.
000000E6  2    POP_TIME checks for stack underflow, then pops the next time off
000000E6  2    the stack and decrements the index to the top of the stack.
000000E6  2
000000E6  2    Input:  1) STACK, the stack from which ENTRY is to be popped
000000E6  2            2) TOP, the current top of the stack
000000E6  2    Output:  1) STACK, the stack with the entry popped off
000000E6  2             2) TOP, the new index to the top of the stack
000000E6  2             3) ENTRY, the entry which was popped from the stack
000000E6  2             4) CODE, a code specifying how the operation turned out:
000000E6  2                  1 indicates no error:  operation completed
000000E6  2                 -1 indicates stack underflow
000000E6  2                                                              *)
```

```
000000E6  2  BEGIN (* Procedure POP_TIME *)
000000E6  2    IF TOP < 0
000000F0  2      THEN (* The impossible has happened:  stack underflow *)
000000F0  2        CODE := -1 (* Set code to indicate error *)
000000FC  2      ELSE (* Stack is alright:  not empty *)
000000FC  2        BEGIN (* Pop entry from stack, then decrement top *)
000000FC  2          ENTRY := STACK [ TOP ];
00000114  2          TOP := TOP - 1;
0000011E  2          CODE := 1 (* Set code to indicate O.K. *)
00000126  2        END (* Pop entry from stack, then decrement top *)
00000126  2  END; (* Procedure POP_TIME *)
00000000  1  $GLOBPROC OFF$
00000000  1
00000000  1
00000000  1
00000000  1
00000000  1
00000000  1  (*
00000000  1                          *******************
00000000  1                          ***** DIV_64 *****
00000000  1                          *******************
00000000  1                                                                   *)
00000000  1  $GLOBPROC ON$
00000000  1  PROCEDURE DIV_64 ( VAR DIVIDEND:  DOUBLE_ARRAY; DIVISOR:  S_INT;
00000000  2                     VAR QUOTIENT:  DOUBLE_ARRAY; VAR REMAINDER:  L_INT );
00000000  2  (*
00000000  2    Procedure DIV_64 to divide a 64 bit number by a 16 bit number using
00000000  2    the pictorial algorithm shown below.
00000000  2
00000000  2    Input:  1) DIVIDEND, the 64 bit dividend
00000000  2            2) DIVISOR, the 16 bit divisor
00000000  2    Output:  1) QUOTIENT, the quotient of the division
00000000  2             2) REMAINDER, the remainder of the division
00000000  2
00000000  2            DIVIDEND [ 0 ]    DIVIDEND [ 1 ]
00000000  2           _________________________________
00000000  2          |       |       |       |       |
00000000  2          |_______|_______|_______|_______|
00000000  2          \__  __________/
00000000  2              \/
00000000  2          1st DIV
00000000  2          - UPPER * DIVISOR
00000000  2                  \__  __________/
00000000  2                      \/
00000000  2                  2nd DIV
00000000  2                  - MIDDLE * DIVISOR
00000000  2                          \__  __________/
00000000  2                              \/
00000000  2                          3rd DIV
00000000  2
00000000  2               UPPER
00000000  2           _______________
00000000  2          |       |       |
00000000  2          |_______|_______|
00000000  2
00000000  2                 + MIDDLE
00000000  2                   _______________
00000000  2                  |       |       |
00000000  2                  |_______|_______|
00000000  2
00000000  2                          + LOWER
00000000  2                           _______________
00000000  2                          |       |       |
00000000  2                          |_______|_______|
00000000  2
00000000  2                          =
00000000  2                          v
00000000  2           _________________________________
00000000  2          |       |       |       |       |
00000000  2          |_______|_______|_______|_______|
00000000  2            QUOTIENT [ 0 ]    QUOTIENT [ 1 ]
00000000  2                                                                   *)
00000000  2  VAR
00000000  2
```

```
00000000 2   UPPER:  L_INT; (* Result of upper division *)
00000004 2
00000004 2   MIDDLE:  L_INT; (* Result of middle division *)
00000008 2
00000008 2   LOWER:  L_INT; (* Result of lower division *)
0000000C 2
0000000C 2   TEMP:  L_INT; (* Temporary storage *)
0000012E 2
0000012E 2  BEGIN (* Procedure DIV_64 *)
0000012E 2   UPPER := DIVIDEND [ 0 ] DIV DIVISOR;
00000144 2   DIVIDEND [ 0 ] := DIVIDEND [ 0 ] - ( UPPER * DIVISOR );
00000152 2   MIDDLE := ( SHIFT ( DIVIDEND [ 0 ], 16 ) + SHIFT ( DIVIDEND [ 1 ],
00000152 2            -16 ) ) DIV DIVISOR;
00000176 2   TEMP := ( SHIFT ( DIVIDEND [ 0 ], 16 ) + SHIFT ( DIVIDEND [ 1 ],
00000176 2          -16 ) ) - ( MIDDLE * DIVISOR );
00000190 2   DIVIDEND [ 1 ] := SHIFT ( SHIFT ( DIVIDEND [ 1 ], 16 ), -16 ) +
00000190 2                     SHIFT ( TEMP, 16 );
000001A0 2   LOWER := DIVIDEND [ 1 ] DIV DIVISOR;
000001B8 2
000001B8 2   (* Return result *)
000001B8 2
000001B8 2   QUOTIENT [ 0 ] := UPPER + SHIFT ( MIDDLE, -16 );
000001D0 2   QUOTIENT [ 1 ] := LOWER + SHIFT ( MIDDLE, 16 );
000001E6 2   REMAINDER := DIVIDEND [ 1 ] MOD DIVISOR
00000200 2  END; (* Procedure DIV_64 *)
00000000 1  $GLOBPROC OFF$
00000000 1
00000000 1
00000000 1
00000000 1
00000000 1
00000000 1  (*
00000000 1                        ***********************
00000000 1                        ***** COMPARE_64 *****
00000000 1                        ***********************
00000000 1                                                                  *)
00000000 1
00000000 1  $GLOBPROC ON$
00000000 1  PROCEDURE COMPARE_64 ( FIND_HI:  BOOLEAN; VAR VALUE1, VALUE2, RET_VALUE:
00000000 2                       DOUBLE_ARRAY );
00000000 2  (*
00000000 2   Procedure COMPARE_64 to compare two 64 bit numbers and return the
00000000 2   smaller or larger of the two, whichever is requested.  If either
00000000 2   number is negative, a -1 is returned.  Otherwise, the two numbers
00000000 2   are subtracted to decide which is bigger.
00000000 2
00000000 2   COMPARE_64 uses the following routine:  SUB_64.
00000000 2
00000000 2   Input:  1) FIND_HI, a flag indicating if you want to find the larger
00000000 2              ( TRUE ) or smaller ( FALSE ) of the two numbers
00000000 2           2) VALUE1, the first value
00000000 2           3) VALUE2, the second value
00000000 2   Output:  1) RET_VALUE, the larger/smaller of the two numbers, or
00000000 2               -1 indicating at least one number was negative
00000000 2                                                                  *)
00000000 2  VAR
00000000 2
00000000 2   TEMP_VALUE:  DOUBLE_ARRAY; (* Storage for result of subtraction:  don't
00000008 2                               use RET_VALUE!! *)
00000008 2
00000008 2   FLAG:  BOOLEAN; (* Flag indicating if 1st value is bigger than 2nd *)
00000208 2
00000208 2  BEGIN (* Procedure COMPARE_64 *)
00000208 2   IF ( VALUE1 [ 0 ] < 0 ) OR ( VALUE2 [ 0 ] < 0 )
00000226 2     THEN (* Overflow *)
00000226 2       BEGIN (* Return -1 *)
00000226 2         RET_VALUE [ 0 ] := -1;
00000230 2         RET_VALUE [ 1 ] := -1
0000023C 2       END (* Return -1 *)
00000240 2     ELSE (* Haven't overflowed yet *)
00000240 2       BEGIN (* Check to see who is bigger *)
00000240 2         SUB_64 ( VALUE1, VALUE2, TEMP_VALUE );
0000025A 2         IF ( ( TEMP_VALUE [ 0 ] >= 0 ) AND ( FIND_HI = TRUE ) ) OR
0000025A 2            ( ( TEMP_VALUE [ 0 ] < 0 ) AND ( FIND_HI = FALSE ) )
```

```
00000290  2            THEN (* Value 1 is the one we want *)
00000290  2              BEGIN (* Return value 1 *)
00000290  2                RET_VALUE [ 0 ] := VALUE1 [ 0 ];
0000029A  2                RET_VALUE [ 1 ] := VALUE1 [ 1 ]
000002A6  2              END (* Return value 1 *)
000002AC  2            ELSE (* Value 2 is the one we want *)
000002AC  2              BEGIN (* Return value 2 *)
000002AC  2                RET_VALUE [ 0 ] := VALUE2 [ 0 ];
000002B6  2                RET_VALUE [ 1 ] := VALUE2 [ 1 ]
000002C4  2              END (* Return value 2 *)
000002C4  2        END (* Check to see who is bigger *)
000002C4  2  END; (* Procedure COMPARE_64 *)
00000000  1  $GLOBPROC OFF$
00000000  1
00000000  1
00000000  1
00000000  1
00000000  1
00000000  1  (*
00000000  1                        ***********************
00000000  1                        ***** UNLOAD_DONE *****
00000000  1                        ***********************
00000000  1                                                                   *)
00000000  1  $GLOBPROC ON$
00000000  1  FUNCTION UNLOAD_DONE ( COUNT:  S_INT ):  BOOLEAN;
000002CC  2  (*
000002CC  2    Function UNLOAD_DONE to determine when the unload sequence is done.
000002CC  2    Procedure checks to see if the count has reached or exceeded the
000002CC  2    allowed maximum, as well as checking to see if the user has requested
000002CC  2    a halt.  If either has occurred, a true is returned, otherwise a
000002CC  2    false.
000002CC  2
000002CC  2    Input:  1) COUNT, the current unload count
000002CC  2    Output:  1) a flag indicating if the unload is finished:  TRUE if
000002CC  2                count has exceeded maximum or user has hit halt, FALSE
000002CC  2                otherwise
000002CC  2                                                                   *)
000002CC  2  BEGIN (* Function UNLOAD_DONE *)
000002CC  2    IF ( COUNT >= MAX_UNLD_COUNT ) OR ( CARE_PACKAGE^.ACTION <> EXECUTE )
000002F2  2      THEN (* Quit *)
000002F2  2        UNLOAD_DONE := TRUE
000002FC  2      ELSE (* Keep going *)
000002FC  2        UNLOAD_DONE := FALSE
00000300  2  END; (* Function UNLOAD_DONE *)
00000000  1  $GLOBPROC OFF$
00000000  1  .

509: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic Controller HW Resource Manager"
00000000  1  PROGRAM HW_RSRCS;
00000000  1  (*
00000000  1  ****************************** HW_RSRCS ******************************
00000000  1    HW_RSRCS is the module containing all the necessary routines for
00000000  1    hardware resource management in the Soda Dynamic Controller.  Routines
00000000  1    for allocating resources, low and high level, are all right here.
00000000  1    HW_RSRCS is processor independent.
00000000  1    Author:  Kip Fulghum
00000000  1    Date:  1-17-83  Revised:  5-3-84
00000000  1  **********************************************************************
00000000  1
00000000  1    HW_RSRCS contains the following routines:
00000000  1    -Procedure CHANGE_POLARITY changes the logic polarity of the given
00000000  1     signal.
00000000  1    -Procedure AVAIL_LL_RSRC finds one available low level resource of
00000000  1     all types.
00000000  1    -Function NEEDED_LL_RSRC determines the type of low level resource
00000000  1     actually needed.
00000000  1    -Function WHICH_LL_RSRC chooses the best low level resource from the
00000000  1     given available resources.
00000000  1    -Procedure GIVE_LL_RSRC gives the given low level resource away.
```

```
00000000  1    -Procedure FIND_LL_RSRC finds the portions of a low level resource
00000000  1     with the given I.D.
00000000  1    -Global function ASSIGN_LL_RSRC allocates a low level resource from
00000000  1     those currently avaliable.
00000000  1    -Global procedure MERGE_LL_RSRC merges the signals from the matching
00000000  1     portions of a low level resource with the existing signals of a
00000000  1     high level resource.
00000000  1    -Global procedure CHANGE_LL_RSRC changes the values assigned to a low
00000000  1     level resource.
00000000  1    -Global procedure REVERSE_LL_RSRC reverses the logic polarity of a low
00000000  1     level resource.
00000000  1    -Global function ASSIGN_HL_RSRC allocates a high level resource from
00000000  1     those currently avaliable.
00000000  1    -Global function ASSIGN_PATH allocates the necessary resources to
00000000  1     form a path from the low level resources to the high level resources.
00000000  1    -Global procedure MERGE_MS_RSRC merges the given miscellaneous
00000000  1     signal with the existing signals of a high level resource.
00000000  1    -Global procedure REVERSE_MS_RSRC reverses the logic polarity of a
00000000  1     miscellaneous signal.
00000000  1    -Global function ASSIGN_MPATH allocates the necessary resources to
00000000  1     form a path from the miscellaneous signals to the high level
00000000  1     resources.
00000000  1                                                                        *)
00000000  1  (*
00000000  1                        **************************
00000000  1                        ***** Include Files *****
00000000  1                        **************************
00000000  1                                                                        *)
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1
00000000  1
00000000  1
00000000  1
00000000  1  (*
00000000  1                        ****************************
00000000  1                        ***** CHANGE_POLARITY *****
00000000  1                        ****************************
00000000  1                                                                        *)
00000000  1  PROCEDURE CHANGE_POLARITY ( VAR SIGNAL:  CONDITION_REC );
00000004  2  (*
00000004  2   Procedure CHANGE_POLARITY to change the logic polarity of the given
00000004  2   signal.
00000004  2
00000004  2   Input:  1) SIGNAL, the record describing the current condition of
00000004  2              the signal
00000004  2   Output:  1) SIGNAL, the updated record describing the signal with
00000004  2               reversed logic polarity
00000004  2                                                                        *)
00000004  2  BEGIN (* Procedure CHANGE_POLARITY *)
00000004  2    IF SIGNAL.TRUE_POLARITY = HIGH
00000010  2      THEN (* Currently high true *)
00000010  2        SIGNAL.TRUE_POLARITY := LOW (* Change to low *)
0000001A  2      ELSE (* Currently low true *)
0000001A  2        SIGNAL.TRUE_POLARITY := HIGH (* Change to high *)
00000022  2  END; (* Procedure CHANGE_POLARITY *)
00000000  1
00000000  1
00000000  1
00000000  1
00000000  1
00000000  1  (*
00000000  1                        **************************
00000000  1                        ***** AVAIL_LL_RSRC *****
00000000  1                        **************************
00000000  1                                                                        *)
00000000  1  PROCEDURE AVAIL_LL_RSRC ( VAR LL_ARRAY:  LL_ARRAY_TYPE; VAR AVAIL_D_EQ,
00000000  2                          AVAIL_D_RG, AVAIL_HLF_D_RG, AVAIL_A_EQ,
00000000  2                          AVAIL_A_RG, AVAIL_HLF_A_RG, AVAIL_O_EQ:
00000000  2                          S_INT );
```

```
00000000  2  (*
00000000  2    Procedure AVAIL_LL_RSRC to find one available low level resource of
00000000  2    all types.  Procedure looks through all the low level resources and
00000000  2    returns the last available resource of every type, including half
00000000  2    ranges.  If a particular type is not available, an indication is
00000000  2    also returned to the caller.
00000000  2
00000000  2    Note:  equate resources are allocated in the following order:
00000000  2            1) available equates
00000000  2            2) upper 1/2 of range resource
00000000  2            3) lower 1/2 of range resource
00000000  2           This assures that if any part of a range is available, the
00000000  2           lower I.D. still indicates free.
00000000  2
00000000  2    Input:  1) LL_ARRAY, the structure describing usage of all the low
00000000  2               level resources
00000000  2    Output:  1) AVAIL_D_EQ, the number of the last available data
00000000  2                equate resource, or -1 if none are available
00000000  2             2) AVAIL_D_RG, the number of the last available data
00000000  2                range resource, or -1 if none are available
00000000  2             3) AVAIL_HLF_D_RG, the number of the last available half of
00000000  2                a data range resource, or -1 if none are available
00000000  2             4) AVAIL_A_EQ, the number of the last available address
00000000  2                equate resource, or -1 if none are available
00000000  2             5) AVAIL_A_RG, the number of the last available address
00000000  2                range resource, or -1 if none are available
00000000  2             6) AVAIL_HLF_A_RG, the number of the last available half of
00000000  2                an address range resource, or -1 if none are available
00000000  2             7) AVAIL_O_EQ, the number of the last available opcode
00000000  2                equate resource, or -1 if none are available
00000000  2                                                                        *)
00000000  2  VAR
00000000  2
00000000  2    I: LL_RESOURCE_NUMS; (* FOR loop counter *)
0000002A  2
0000002A  2  BEGIN (* Procedure AVAIL_LL_RSRC *)
0000002A  2
0000002A  2    (* Assume nothing is available *)
0000002A  2
0000002A  2    AVAIL_D_EQ := -1;
00000032  2    AVAIL_D_RG := -1;
0000003A  2    AVAIL_HLF_D_RG := -1;
00000042  2    AVAIL_A_EQ := -1;
0000004A  2    AVAIL_A_RG := -1;
00000052  2    AVAIL_HLF_A_RG := -1;
0000005A  2    AVAIL_O_EQ := -1;
00000062  2
00000062  2    (* Search array for all possible available types of resources *)
00000062  2
00000062  2    FOR I := 0 TO MAX_LL_RESOURCES - 1 DO
00000066  2      WITH LL_ARRAY [ I ] DO
0000007C  2        IF LO_TRACE_ID = -1
00000088  2          THEN (* At least part of this resource is available *)
00000088  2            CASE RESOURCE_TYPE OF
00000090  2              DATA_EQUATE:
00000090  2                AVAIL_D_EQ := I;
000000A0  2              DATA_RANGE:
000000A0  2                IF HI_TRACE_ID = -1
000000B0  2                  THEN (* This is a useable range *)
000000B0  2                    AVAIL_D_RG := I
000000C0  2                  ELSE (* Part of a range *)
000000C0  2                    AVAIL_HLF_D_RG := I;
000000D0  2              ADDRESS_EQUATE:
000000D0  2                AVAIL_A_EQ := I;
000000E0  2              ADDRESS_RANGE:
000000E0  2                IF HI_TRACE_ID = -1
000000F0  2                  THEN (* This is a useable range *)
000000F0  2                    AVAIL_A_RG := I
00000100  2                  ELSE (* Part of a range *)
00000100  2                    AVAIL_HLF_A_RG := I;
00000110  2              OTHERWISE (* Assume opcode fetch *)
00000110  2                AVAIL_O_EQ := I
0000011C  2            END (* Of case statement *)
00000154  2  END; (* Procedure AVAIL_LL_RSRC *)
```

```
00000000  1
00000000  1
00000000  1
00000000  1
00000000  1
00000000  1  (*
00000000  1                          **************************
00000000  1                          ***** NEEDED_LL_RSRC *****
00000000  1                          **************************
00000000  1                                                                   *)
00000000  1  FUNCTION NEEDED_LL_RSRC ( RSRC_TYPE:  LL_TYPE; LO_VALUE, LO_MASK,
00000000  2                              HI_VALUE, HI_MASK:  L_INT ):  LL_TYPE;
0000015C  2  (*
0000015C  2    Function NEEDED_LL_RSRC to determine the type of low level resource
0000015C  2    actually needed based on the type asked for and the low/high masks
0000015C  2    and values.  If the request is for an equate, it is the needed type.
0000015C  2    If the request is for a range and a range is not needed, only an
0000015C  2    appropriate equate is granted, otherwise a range is needed.
0000015C  2
0000015C  2    Input:  1) RSRC_TYPE, the type of low level resource desired
0000015C  2            2) LO_VALUE, the lower status value
0000015C  2            3) LO_MASK, the lower status care/don't care mask
0000015C  2            4) HI_VALUE, the upper status value ( 0 if equate resource
0000015C  2               requested )
0000015C  2            5) HI_MASK, the upper status care/don't care mask ( 0 if
0000015C  2               equate resource requested )
0000015C  2    Output:  1) the type of low level resource actually needed by the
0000015C  2                caller, in function name
0000015C  2                                                                   *)
0000015C  2  BEGIN (* Function NEEDED_LL_RSRC *)
0000015C  2
0000015C  2    (* Determine what the minimum is that we can give away *)
0000015C  2
0000015C  2    IF ( ( RSRC_TYPE = ADDRESS_RANGE ) OR ( RSRC_TYPE = DATA_RANGE ) ) AND
0000015C  2       ( ( LO_VALUE = HI_VALUE ) AND ( LO_MASK = HI_MASK ) )
0000019A  2      THEN (* Don't need a range *)
0000019A  2        IF RSRC_TYPE = ADDRESS_RANGE
000001A2  2          THEN (* Give an address equate *)
000001A2  2            NEEDED_LL_RSRC := ADDRESS_EQUATE
000001AC  2          ELSE (* Give a data equate *)
000001AC  2            NEEDED_LL_RSRC := DATA_EQUATE
000001B4  2      ELSE (* Give the caller what he wants *)
000001B4  2        NEEDED_LL_RSRC := RSRC_TYPE
000001BA  2  END; (* Function NEEDED_LL_RSRC *)
00000000  1
00000000  1
00000000  1
00000000  1
00000000  1
00000000  1  (*
00000000  1                          **************************
00000000  1                          ***** WHICH_LL_RSRC *****
00000000  1                          **************************
00000000  1                                                                   *)
00000000  1  FUNCTION WHICH_LL_RSRC ( AVAIL_D_EQ, AVAIL_D_RG, AVAIL_HLF_D_RG,
00000000  2                           AVAIL_A_EQ, AVAIL_A_RG, AVAIL_HLF_A_RG,
00000000  2                           AVAIL_O_EQ:  S_INT; NEEDED_TYPE:  LL_TYPE ):
00000000  2                           S_INT;
00000002  2  (*
00000002  2    Function WHICH_LL_RSRC to choose the best low level resource from the
00000002  2    given available resources and return it to the caller.  Function
00000002  2    tries to give away equates first, then half ranges if an equate is
00000002  2    needed.  Otherwise, a range is given away.  If nothing appropriate
00000002  2    is available, an error is returned to the caller.
00000002  2
00000002  2    Input:  1) AVAIL_D_EQ, the number of an available data equate
00000002  2               resource ( or -1 if none are available )
00000002  2            2) AVAIL_D_RG, the number of an available data range
00000002  2               resource ( or -1 if none are available )
00000002  2            3) AVAIL_HLF_D_RG, the number of an available half of a
00000002  2               data range resource ( or -1 if none are available )
00000002  2            4) AVAIL_A_EQ, the number of an available address equate
00000002  2               resource ( or -1 if none are available )
00000002  2            5) AVAIL_A_RG, the number of an available address range
```

```
00000002  2              resource, or -1 if none are available
00000002  2            4) AVAIL_HLF_A_RG, the number of an available half of an
00000002  2              address range resource, or -1 if none are available
00000002  2            7) AVAIL_O_EQ, the number of an available opcode equate
00000002  2              resource, or -1 if none are available
00000002  2            8) NEEDED_TYPE, the type of low level resource actually needed
00000002  2              by the caller
00000002  2    Output:  1) the number of the assigned low level resource in function
00000002  2               name, or:
00000002  2                 -1 indicates out of low level resources
00000002  2                                                                        *)
00000002  2  VAR
00000002  2
00000002  2    RESOURCE:  S_INT; (* Assigned resource number *)
00000108  2
00000108  2  BEGIN (* Function WHICH_LL_RSRC *)
00000108  2
00000108  2    (* Determine what we have to give away *)
00000108  2
00000108  2    RESOURCE := OUT_OF_L_RSRCS; (* Assume we have nothing to give *)
000001CE  2    CASE NEEDED_TYPE OF
000001D8  2      DATA_EQUATE:
000001D8  2        IF AVAIL_D_EQ <> -1
000001E4  2          THEN (* Give away this equate *)
000001E4  2            RESOURCE := AVAIL_D_EQ
000001EC  2          ELSE (* Check for half range *)
000001EC  2            IF AVAIL_HLF_D_RG <> -1
000001F8  2              THEN (* There is half a range available *)
000001F8  2                RESOURCE := AVAIL_HLF_D_RG
00000200  2              ELSE (* No half ranges available *)
00000200  2                IF AVAIL_D_RG <> -1
0000020C  2                  THEN (* There still is a full range left *)
0000020C  2                    RESOURCE := AVAIL_D_RG;
00000214  2      DATA_RANGE:
00000214  2        IF AVAIL_D_RG <> -1
00000220  2          THEN (* Give away this range *)
00000220  2            RESOURCE := AVAIL_D_RG;
00000228  2      ADDRESS_EQUATE:
00000228  2        IF AVAIL_A_EQ <> -1
00000234  2          THEN (* Give away this equate *)
00000234  2            RESOURCE := AVAIL_A_EQ
0000023C  2          ELSE (* Check for half range *)
0000023C  2            IF AVAIL_HLF_A_RG <> -1
00000248  2              THEN (* There is half a range available *)
00000248  2                RESOURCE := AVAIL_HLF_A_RG
00000250  2              ELSE (* No half ranges available *)
00000250  2                IF AVAIL_A_RG <> -1
0000025C  2                  THEN (* There still is a full range left *)
0000025C  2                    RESOURCE := AVAIL_A_RG;
00000264  2      ADDRESS_RANGE:
00000264  2        IF AVAIL_A_RG <> -1
00000270  2          THEN (* Give away this range *)
00000270  2            RESOURCE := AVAIL_A_RG;
00000278  2      OTHERWISE (* Assume opcode fetch *)
00000278  2        IF AVAIL_O_EQ <> -1
00000284  2          THEN (* Give this opcode resource away *)
00000284  2            RESOURCE := AVAIL_O_EQ
0000028C  2    END; (* Of case statement *)
0000028E  2    WHICH_LL_RSRC := RESOURCE (* Assign final function value *)
00000294  2  END; (* Function WHICH_LL_RSRC *)
00000000  1
00000000  1
00000000  1
00000000  1
00000000  1
00000000  1  (*
00000000  1                         *************************
00000000  1                         ***** GIVE_LL_RSRC *****
00000000  1                         *************************
00000000  1                                                                        *)
00000000  1  PROCEDURE GIVE_LL_RSRC ( RSRC_ID:  S_INT; LO_VALUE, LO_MASK, HI_VALUE,
00000000  2                           HI_MASK:  L_INT; NEEDED_TYPE:  LL_TYPE;
00000000  2                           VAR LL_RSRC:  LL_RESOURCE );
00000002  2  (*
00000002  2    Procedure GIVE_LL_RSRC to give the given low level resource away.
```

```
000002C2  2    Procedure determines what part of the resource to give away, then
000002C2  2    marks it as used and assigns the values and masks.
000002C2  2
000002C2  2    Note:  equate resources are allocated in the following order:
000002C2  2             1) available equates
000002C2  2             2) upper 1/2 of range resource
000002C2  2             3) lower 1/2 of range resource
000002C2  2            This assures that if any part of a range is available, the
000002C2  2            lower I.D. still indicates free.
000002C2  2
000002C2  2    Input:  1) RSRC_ID, the I.D. to be assigned to the resource
000002C2  2            2) LO_VALUE, the lower status value
000002C2  2            3) LO_MASK, the lower status care/don't care mask
000002C2  2            4) HI_VALUE, the upper status value ( 0 if equate resource
000002C2  2               requested )
000002C2  2            5) HI_MASK, the upper status care/don't care mask ( 0 if
000002C2  2               equate resource requested )
000002C2  2            6) NEEDED_TYPE, the type of low level resource actually needed
000002C2  2               by the caller
000002C2  2            7) LL_RSRC, the record describing the assigned low level
000002C2  2               resource
000002C2  2    Output:  1) LL_RSRC, the modified low level resource record marked
000002C2  2                as used and with assigned values/masks
000002C2  2                                                                          *)
000002C2  2  BEGIN (* Procedure GIVE_LL_RSRC *)
000002C2  2
000002C2  2    (* Give it away *)
000002C2  2
000002C2  2    WITH LL_RSRC DO
000002CA  2      IF ( NEEDED_TYPE = ADDRESS_RANGE ) OR ( NEEDED_TYPE = DATA_RANGE )
000002D8  2        THEN (* Give away this range *)
000002E8  2          BEGIN (* Set up lower and upper masks and values *)
000002E8  2            LO_TRACE_ID := RSRC_ID;
000002EE  2            HI_TRACE_ID := RSRC_ID;
000002F8  2            LO_BOUND_MASK := LO_MASK;
00000302  2            LO_BOUND_VALUE := LO_VALUE;
0000030C  2            HI_BOUND_MASK := HI_MASK;
00000316  2            HI_BOUND_VALUE := HI_VALUE;
00000320  2            LL_OUTPUT [ GE_LO ].CONDITION := ON;
0000032A  2            LL_OUTPUT [ LE_HI ].CONDITION := ON
00000335  2          END (* Set up lower and upper masks and values *)
0000033A  2        ELSE (* Needed an equate:  check for split range *)
0000033A  2          IF ( ( RESOURCE_TYPE = ADDRESS_RANGE ) OR ( RESOURCE_TYPE =
0000033A  2              DATA_RANGE ) ) AND ( HI_TRACE_ID = -1 )
0000036A  2            THEN (* Only needed an equate, but had to use the upper
0000036A  2                    portion of a range *)
0000036A  2              BEGIN (* Set up upper mask and value *)
0000036A  2                HI_TRACE_ID := RSRC_ID;
00000374  2                HI_BOUND_MASK :=  LO_MASK;
0000037E  2                HI_BOUND_VALUE := LO_VALUE;
00000388  2                LL_OUTPUT [ EQ_HI ].CONDITION := ON
00000394  2              END (* Set up upper mask and value *)
00000398  2            ELSE (* Needed an equate and got one or lower portion of
00000398  2                    a range *)
00000398  2              BEGIN (* Set up lower mask and value *)
00000398  2                LO_TRACE_ID := RSRC_ID;
000003A2  2                LO_BOUND_MASK := LO_MASK;
000003AC  2                LO_BOUND_VALUE := LO_VALUE;
000003B6  2                LL_OUTPUT [ EQ_LO ].CONDITION := ON
000003C2  2              END (* Set up lower mask and value *)
000003C2  2  END; (* Procedure GIVE LL RSRC *)
00000000  1
00000000  1
00000000  1
00000000  1
00000000  1
00000000  1  (*
00000000  1                      **************************
00000000  1                      ***** FIND_LL_RSRC *****
00000000  1                      **************************
00000000  1                                                                          *)
00000000  1  PROCEDURE FIND_LL_RSRC ( RSRC_ID:  S_INT; VAR LL_ARRAY:  LL_ARRAY_TYPE;
00000000  2                          VAR LL_NUM, LL_PART:  S_INT );
00000000  2  (*
00000000  2    Procedure FIND_LL_RSRC to find the portions of a low level resource
```

```
00000000  2    with the given I.D.  Procedure first finds the resource, then
00000000  2    whether the lower and/or upper parts are associated with the given
00000000  2    I.D.
00000000  2
00000000  2    Input:  1) RSRC_ID, the resource I.D. to look for
00000000  2            2) LL_ARRAY, the structure describing usage of all the low
00000000  2               level resources
00000000  2    Output:  1) LL_NUM, the number of the low level resource, or:
00000000  2                -1 indicates not found
00000000  2             2) LL_PART, the part of the low level resource used:
00000000  2                -1 indicates not found
00000000  2                 1 indicates lower part
00000000  2                 2 indicates upper part
00000000  2                 3 indicates both lower and upper parts
00000000  2                                                                    *)
00000000  2  VAR
00000000  2
00000000  2    I:  LL_RESOURCE_NUMS; (* FOR loop counter *)
000003CA  2
000003CA  2  BEGIN (* Procedure FIND_LL_RSRC *)
000003CA  2
000003CA  2    (* Search array for resource I.D. *)
000003CA  2
000003CA  2    I := 0;
000003CE  2    LL_NUM := -1;
000003D6  2    LL_PART := -1;
000003DE  2    WHILE ( I < MAX_LL_RESOURCES ) AND ( LL_NUM = -1 ) DO
00000402  2      WITH LL_ARRAY [ I ] DO
00000414  2        IF ( LO_TRACE_ID = RSRC_ID ) OR ( HI_TRACE_ID = RSRC_ID )
00000436  2          THEN (* Found the resource *)
00000436  2            BEGIN (* Remember which one we found *)
00000436  2              LL_NUM := I;
00000442  2              IF LO_TRACE_ID = HI_TRACE_ID
00000452  2                THEN (* Used as a range *)
00000452  2                  LL_PART := 3
0000045E  2                ELSE (* Only part is being used *)
0000045E  2                  IF LO_TRACE_ID = RSRC_ID
0000046E  2                    THEN (* Lower part *)
0000046E  2                      LL_PART := 1
0000047A  2                    ELSE (* Upper part *)
0000047A  2                      LL_PART := 2
00000482  2            END (* Remember which one we found *)
00000486  2          ELSE (* Haven't found it yet *)
00000486  2            I := I + 1;
0000048E  2  END; (* Procedure FIND_LL_RSRC *)
00000000  1
00000000  1
00000000  1
00000000  1
00000000  1
00000000  1  (*
00000000  1                          ***************************
00000000  1                          ***** ASSIGN_LL_RSRC *****
00000000  1                          ***************************
00000000  1                                                                    *)
00000000  1  $GLOBPROC ON$
00000000  1  FUNCTION ASSIGN_LL_RSRC ( RSRC_TYPE:  LL_TYPE; RSRC_ID:  S_INT;
00000000  2                          LO_VALUE, LO_MASK, HI_VALUE, HI_MASK:
00000000  2                          L_INT; VAR LL_ARRAY:  LL_ARRAY_TYPE ):  S_INT;
00000002  2  (*
00000002  2    Function ASSIGN_LL_RSRC to allocate a low level resource from those
00000002  2    available for use by the caller.  Function first looks for available
00000002  2    resources of all types, then determines the best one to give to the
00000002  2    user.  If one is not available, an indication is returned that there
00000002  2    are no more low level resources which can do the job.  If one is
00000002  2    available, it is given away.
00000002  2
00000002  2    ASSIGN_LL_RSRC uses the following routines:  AVAIL_LL_RSRC,
00000002  2    NEEDED_LL_RSRC, WHICH_LL_RSRC, and GIVE_LL_RSRC.
00000002  2
00000002  2    Note:  equate resources are allocated in the following order:
00000002  2           1) available equates
00000002  2           2) upper 1/2 of range resource
00000002  2           3) lower 1/2 of range resource
00000002  2          This assures that if any part of a range is available, the
```

```
00000002  2          lower I.D. still indicates free.
00000002  2
00000002  2   Input:  1) RSRC_TYPE, the type of low level resource desired
00000002  2           2) RSRC_ID, the I.D. to be assigned to the resource
00000002  2           3) LO_VALUE, the lower status value
00000002  2           4) LO_MASK, the lower status care/don't care mask
00000002  2           5) HI_VALUE, the upper status value ( 0 if equate resource
00000002  2              requested )
00000002  2           6) HI_MASK, the upper status care/don't care mask ( 0 if
00000002  2              equate resource requested )
00000002  2           7) LL_ARRAY, the structure describing usage of all the low
00000002  2              level resources
00000002  2   Output:  1) LL_ARRAY, the updated structure describing usage of all
00000002  2               the low level resources
00000002  2            2) the number of the assigned low level resource in function
00000002  2               name, or:
00000002  2                 -1 indicates out of low level resources
00000002  2
00000002  2  VAR
00000002  2
00000002  2    AVAIL_D_EQ:  S_INT; (* Last available data equate resource *)
00000004  2
00000004  2    AVAIL_D_RG:  S_INT; (* Last available data range resource *)
00000006  2
00000006  2    AVAIL_HLF_D_RG:  S_INT; (* Last available half data range *)
00000008  2
00000008  2    AVAIL_A_EQ:  S_INT; (* Last available address equate resource *)
0000000A  2
0000000A  2    AVAIL_A_RG:  S_INT; (* Last available address range resource *)
0000000C  2
0000000C  2    AVAIL_HLF_A_RG:  S_INT; (* Last available half address range *)
0000000E  2
0000000E  2    AVAIL_O_EQ:  S_INT; (* Last available opcode equate resource *)
00000010  2
00000010  2    RESOURCE:  S_INT; (* Assigned resource number *)
00000012  2
00000012  2    NEEDED_TYPE:  LL_TYPE; (* Minimum type of resource that can be used
00000496  2                             to do the job *)
00000496  2
00000496  2  BEGIN (* Function ASSIGN_LL_RSRC *)
00000496  2
00000496  2    (* Figure out which ones are available *)
00000496  2
00000496  2    AVAIL_LL_RSRC ( LL_ARRAY, AVAIL_D_EQ, AVAIL_D_RG, AVAIL_HLF_D_RG,
00000496  2                    AVAIL_A_EQ, AVAIL_A_RG, AVAIL_HLF_A_RG, AVAIL_O_EQ );
000004C2  2
000004C2  2    (* Now determine what the minimum is that we can give away *)
000004C2  2
000004C2  2    NEEDED_TYPE := NEEDED_LL_RSRC ( RSRC_TYPE, LO_VALUE, LO_MASK,
000004C2  2                                    HI_VALUE, HI_MASK );
000004E4  2
000004E4  2    (* Next, determine what we have to give away *)
000004E4  2
000004E4  2    RESOURCE := WHICH_LL_RSRC ( AVAIL_D_EQ, AVAIL_D_RG, AVAIL_HLF_D_RG,
000004E4  2                                AVAIL_A_EQ, AVAIL_A_RG, AVAIL_HLF_A_RG,
000004E4  2                                AVAIL_O_EQ, NEEDED_TYPE );
00000512  2
00000512  2    (* Finally, give it away *)
00000512  2
00000512  2    IF RESOURCE >= 0
0000051A  2      THEN (* Found a useable resource *)
0000051A  2        GIVE_LL_RSRC ( RSRC_ID, LO_VALUE, LO_MASK, HI_VALUE, HI_MASK,
0000051A  2                       NEEDED_TYPE, LL_ARRAY [ RESOURCE ] );
00000540  2    ASSIGN_LL_RSRC := RESOURCE (* Assign final function value *)
00000552  2  END; (* Function ASSIGN_LL_RSRC *)
00000000  1  $GLOBPROC OFF$
00000000  1
00000000  1
00000000  1
00000000  1
00000000  1
```

```
00000000  1  (*
00000000  1                    ******************************
00000000  1                    ***** MERGE_LL_RSRC *****
00000000  1                    ******************************
00000000  1                                                                    *)
00000000  1  $GLOBPROC ON$
00000000  1  PROCEDURE MERGE_LL_RSRC ( RSRC_ID:  S_INT; VAR LL_ARRAY:  LL_ARRAY_TYPE;
00000000  2                            VAR HL_RSRC:  HL_RESOURCE );
00000000  2  (*
00000000  2   Procedure MERGE_LL_RSRC to merge the signals from the matching
00000000  2   portions of a low level resource with the existing signals already
00000000  2   being received by the given high level resource.  Procedure
00000000  2   looks for matching I.D.s in the low level resources, then merges
00000000  2   the appropriate signals.  If no matching I.D. is found, nothing is
00000000  2   done.
00000000  2
00000000  2   MERGE_LL_RSRC uses the following routine:  FIND_LL_RSRC
00000000  2
00000000  2   Input:  1) RSRC_ID, the I.D. to be checked for when identifying what
00000000  2              low level resource signals are to be merged
00000000  2           2) LL_ARRAY, the structure describing usage of all the low
00000000  2              level resources
00000000  2           3) HL_RSRC, the high level resource who is to merge in the
00000000  2              appropriate low level resource signals
00000000  2   Output:  1) HL_RSRC, the updated high level resource description
00000000  2                                                                    *)
00000000  2  VAR
00000000  2
00000000  2    LL_NUM:  S_INT; (* Number of low level resource being used *)
00000002  2
00000002  2    LL_PART:  S_INT; (* Part of low level resource being used *)
00000560  2
00000560  2  BEGIN (* Procedure MERGE_LL_RSRC *)
00000560  2
00000560  2    (* Find the appropriate low level resource *)
00000560  2
00000560  2    FIND_LL_RSRC ( RSRC_ID, LL_ARRAY, LL_NUM, LL_PART );
0000057C  2
0000057C  2    (* Now do something about it *)
0000057C  2
0000057C  2    CASE LL_PART OF
00000586  2      1:  (* Lower part being used *)
00000586  2        (* Set up lower equate *)
00000586  2        HL_RSRC.LL_SETS [ EQ_LO ] := HL_RSRC.LL_SETS [ EQ_LO ] +
00000586  2                                     LOW_LEVEL_SET [ LL_NUM ];
000005AC  2      2:  (* Upper part being used *)
000005AC  2        (* Set up upper equate *)
000005AC  2        HL_RSRC.LL_SETS [ EQ_HI ] := HL_RSRC.LL_SETS [ EQ_HI ] +
000005AC  2                                     LOW_LEVEL_SET [ LL_NUM ];
000005D2  2      3:  (* Both parts being used *)
000005D2  2        BEGIN (* Set up range *)
000005D2  2          HL_RSRC.LL_SETS [ GE_LO ] := HL_RSRC.LL_SETS [ GE_LO ] +
000005D2  2                                       LOW_LEVEL_SET [ LL_NUM ];
000005F0  2          HL_RSRC.LL_SETS [ LE_HI ] := HL_RSRC.LL_SETS [ LE_HI ] +
000005FC  2                                       LOW_LEVEL_SET [ LL_NUM ]
00000612  2        END; (* Set up range *)
00000616  2      OTHERWISE (* Not found:  do nothing *)
00000616  2    END (* Of case statement *)
0000063C  2  END; (* Procedure MERGE_LL_RSRC *)
00000000  1  $GLOBPROC OFF$
00000000  1
00000000  1
00000000  1
00000000  1
00000000  1
00000000  1  (*
00000000  1                    ******************************
00000000  1                    ***** CHANGE_LL_RSRC *****
00000000  1                    ******************************
00000000  1                                                                    *)
00000000  1  $GLOBPROC ON$
00000000  1  PROCEDURE CHANGE_LL_RSRC ( RSRC_ID:  S_INT; LO_VALUE, LO_MASK,
00000000  2                             HI_VALUE, HI_MASK:  L_INT; VAR LL_ARRAY:
00000000  2                             LL_ARRAY_TYPE );
00000000  2  (*
00000000  2   Procedure CHANGE_LL_RSRC to change the values assigned to a low level
```

```
00000000  2    resource.  Procedure determines what part of the resource matches to
00000000  2    the given path, then changes its mask(s) and value(s) to those
00000000  2    passed this routine.  If no matching I.D. is found, nothing is done.
00000000  2
00000000  2    CHANGE_LL_RSRC uses the following routine:  FIND_LL_RSRC.
00000000  2
00000000  2    Input:  1) RSRC_ID, the resource I.D. to look for
00000000  2            2) LO_VALUE, the lower status value
00000000  2            3) LO_MASK, the lower status care/don't care mask
00000000  2            4) HI_VALUE, the upper status value ( 0 if equate resource )
00000000  2            5) HI_MASK, the upper status care/don't care mask ( 0 if
00000000  2               equate resource )
00000000  2            6) LL_ARRAY, the structure describing usage of all the low
00000000  2               level resources
00000000  2    Output:  1) LL_ARRAY, the updated low level resource array with
00000000  2                the one resource modified
00000000  2                                                                        *)
00000000  2  VAR
00000000  2
00000000  2    LL_NUM:  S_INT; (* Number of low level resource being used *)
00000002  2
00000002  2    LL_PART:  S_INT; (* Part of low level resource being used *)
00000644  2
00000644  2  BEGIN (* Procedure CHANGE_LL_RSRC *)
00000644  2
00000644  2    (* Find the appropriate low level resource *)
00000644  2
00000644  2    FIND_LL_RSRC ( RSRC_ID, LL_ARRAY, LL_NUM, LL_PART );
00000660  2
00000660  2    (* Now do something about it *)
00000660  2
00000660  2    CASE LL_PART OF
0000066B  2      1:  (* Lower part being used *)
0000066B  2        BEGIN (* Change lower equate *)
0000066B  2          LL_ARRAY [ LL_NUM ].LO_BOUND_MASK := LO_MASK;
00000680  2          LL_ARRAY [ LL_NUM ].LO_BOUND_VALUE := LO_VALUE
00000696  2        END; (* Change lower equate *)
00000698  2      2:  (* Upper part being used *)
00000698  2        BEGIN (* Change upper equate *)
0000069A  2          LL_ARRAY [ LL_NUM ].HI_BOUND_MASK := LO_MASK;
000006B0  2          LL_ARRAY [ LL_NUM ].HI_BOUND_VALUE := LO_VALUE
000006C6  2        END; (* Change upper equate *)
000006CA  2      3:  (* Both parts being used *)
000006CA  2        BEGIN (* Change range *)
000006CA  2          LL_ARRAY [ LL_NUM ].LO_BOUND_MASK := LO_MASK;
000006E0  2          LL_ARRAY [ LL_NUM ].LO_BOUND_VALUE := LO_VALUE;
000006F6  2          LL_ARRAY [ LL_NUM ].HI_BOUND_MASK := HI_MASK;
0000070C  2          LL_ARRAY [ LL_NUM ].HI_BOUND_VALUE := HI_VALUE
00000722  2        END; (* Change range *)
00000726  2      OTHERWISE (* Not found:  do nothing *)
00000726  2    END (* Of case statement *)
00000740  2  END; (* Procedure CHANGE_LL_RSRC *)
00000000  1  $GLOBPROC OFF$
00000000  1
00000000  1
00000000  1
00000000  1
00000000  1
00000000  1  (*
00000000  1                        ******************************
00000000  1                        ***** REVERSE_LL_RSRC *****
00000000  1                        ******************************
00000000  1                                                                        *)
00000000  1  $GLOBPROC ON$
00000000  1  PROCEDURE REVERSE_LL_RSRC ( RSRC_ID:  S_INT; VAR LL_ARRAY:
00000000  2                                  LL_ARRAY_TYPE );
00000000  2  (*
00000000  2    Procedure REVERSE_LL_RSRC to reverse the logic polarity of a low level
00000000  2    resource.  Procedure determines what part of the resource matches to
00000000  2    the given path, then changes its polarity.  If no matching I.D. is
00000000  2    found, nothing is done.
00000000  2
00000000  2    REVERSE_LL_RSRC uses the following routines:  FIND_LL_RSRC and
00000000  2    CHANGE_POLARITY.
00000000  2
```

```
00000000  2    Input:  1) RSRC_ID, the resource I.D. to look for
00000000  2            2) LL_ARRAY, the structure describing usage of all the low
00000000  2               level resources
00000000  2    Output:  1) LL_ARRAY, the updated low level resource array with
00000000  2               the one resource modified
00000000  2                                                                        *)
00000000  2  VAR
00000000  2
00000000  2    LL_NUM:  S_INT; (* Number of low level resource being used *)
00000002  2
00000002  2    LL_PART:  S_INT; (* Part of low level resource being used *)
00000754  2
00000754  2  BEGIN (* Procedure REVERSE_LL_RSRC *)
00000754  2
00000754  2    (* Find the appropriate low level resource *)
00000754  2
00000754  2    FIND_LL_RSRC ( RSRC_ID, LL_ARRAY, LL_NUM, LL_PART );
00000770  2
00000770  2    (* Now do something about it *)
00000770  2
00000770  2    CASE LL_PART OF
0000077A  2      1:  (* Lower part being used *)
0000077A  2        (* Change lower equate *)
0000077A  2        CHANGE_POLARITY ( LL_ARRAY [ LL_NUM ].LL_OUTPUT [ EQ_LO ] );
00000790  2      2:  (* Upper part being used *)
00000790  2        (* Change upper equate *)
00000790  2        CHANGE_POLARITY ( LL_ARRAY [ LL_NUM ].LL_OUTPUT [ EQ_HI ] );
000007BE  2      3:  (* Both parts being used *)
000007BE  2        BEGIN (* Change range *)
000007BE  2          CHANGE_POLARITY ( LL_ARRAY [ LL_NUM ].LL_OUTPUT [ GE_LO ] );
000007DA  2          CHANGE_POLARITY ( LL_ARRAY [ LL_NUM ].LL_OUTPUT [ LE_HI ] )
000007F8  2        END; (* Change range *)
000007FC  2      OTHERWISE (* Not found:  do nothing *)
000007FC  2    END (* Of case statement *)
00000822  2  END; (* Procedure REVERSE_LL_RSRC *)
00000000  1  $GLOBPROC OFF$
00000000  1
00000000  1
00000000  1
00000000  1
00000000  1
00000000  1  (*
00000000  1                               ******************************
00000000  1                               ***** ASSIGN_HL_RSRC *****
00000000  1                               ******************************
00000000  1                                                                        *)
00000000  1  $GLOBPROC ON$
00000000  1  FUNCTION ASSIGN_HL_RSRC ( VAR POSSIBILITIES:  HIGH_LEVEL_SET; VAR
00000000  2                              HL_ARRAY:  HL_ARRAY_TYPE ):  S_INT;
00000002  2  (*
00000002  2    Function ASSIGN_HL_RSRC to allocate a high level resource from those
00000002  2    currently available.  The high level resource array is searched for
00000002  2    the first unused resource which is a possibility.  Its number is
00000002  2    returned to the caller.  If there is no high level resource available,
00000002  2    an error is returned.
00000002  2
00000002  2    Note:  high level resources 8 and 9 are available to both the X and
00000002  2           Y generators.  Therefore, they should be ( and are ) allocated
00000002  2           last to maximize resource usage.
00000002  2
00000002  2    Input:  1) POSSIBILITIES, a set of high level resources from which
00000002  2               to choose from
00000002  2            2) HL_ARRAY, the high level resource array
00000002  2    Output:  1) the number of the assigned high level resource, in
00000002  2                function name, or:
00000002  2                  -4 indicates out of high level resources
00000002  2                                                                        *)
00000002  2  VAR
00000002  2
00000002  2    RESOURCE:  S_INT; (* Allocated high level resource *)
00000004  2
00000004  2    I:  S_INT; (* WHILE loop index *)
00000004  2
```

```
00000006  2    J:  LL_SIGNALS; (* FOR loop index *)
00000007  2
00000007  2    FOUND:  BOOLEAN; (* Flag used to check resource availability *)
0000082A  2
0000082A  2  BEGIN (* Function ASSIGN_HL_RSRC *)
0000082A  2    RESOURCE := OUT_OF_H_RSRCS; (* Be a bit pessimistic *)
00000830  2    I := 0;
00000834  2    WHILE ( I < MAX_HL_RESOURCES ) AND ( RESOURCE = OUT_OF_H_RSRCS ) DO
00000856  2      BEGIN (* Find a high level resource *)
00000856  2        IF I IN POSSIBILITIES
0000086E  2          THEN (* This one is a maybe *)
0000086E  2            WITH HL_ARRAY [ I ] DO
0000087E  2              BEGIN (* Look into it further *)
0000087E  2                FOUND := TRUE; (* Now:  be a bit optimistic *)
00000884  2                FOR J := GE_LO TO LE_HI DO
00000888  2                  IF LL_SETS [ J ] <> []
000008A4  2                    THEN (* This resource is being used *)
000008A4  2                      FOUND := FALSE;
000008B8  2                IF EXTRA_SET <> []
000008C8  2                  THEN (* This resource is being used *)
000008C8  2                    FOUND := FALSE;
000008CC  2                IF FOUND = TRUE
000008D8  2                  THEN (* We caught one *)
000008D8  2                    RESOURCE := I
000008DE  2              END; (* Look into it further *)
000008DE  2        I := I + 1
000008E2  2      END; (* Find a high level resource *)
000008E6  2    ASSIGN_HL_RSRC := RESOURCE (* Assign final function value *)
000008EC  2  END; (* Function ASSIGN_HL_RSRC *)
00000000  1  %GLOBPROC OFF%
00000000  1
00000000  1
00000000  1
00000000  1
00000000  1
00000000  1  (*
00000000  1                        ************************
00000000  1                        ***** ASSIGN_PATH *****
00000000  1                        ************************
00000000  1                                                                  *)
00000000  1  %GLOBPROC ON%
00000000  1  FUNCTION ASSIGN_PATH ( RSRC_TYPE:  LL_TYPE; PATH_ID:  S_INT; LO_VALUE,
00000000  2                         LO_MASK, HI_VALUE, HI_MASK:  L_INT; VAR
00000000  2                         POS_HL_SET:  HIGH_LEVEL_SET; VAR LO_ARRAY:
00000000  2                         LL_ARRAY_TYPE; VAR HI_ARRAY:  HL_ARRAY_TYPE ):
00000000  2                         S_INT;
00000002  2  (*
00000002  2    Function ASSIGN_PATH to allocate the necessary resources to form a
00000002  2    path from the low level resources to the high level resources.
00000002  2    Function tries to allocate a high level resource.  If that works,
00000002  2    a low level resource is then allocated.  If all is still well, the
00000002  2    low level resource is incorporated into the input of the high level
00000002  2    resource.
00000002  2
00000002  2    ASSIGN_PATH uses the following routines:  ASSIGN_LL_RSRC,
00000002  2    ASSIGN_HL_RSRC, and MERGE_LL_RSRC.
00000002  2
00000002  2    Input:  1) RSRC_TYPE, the type of low level resource desired
00000002  2            2) PATH_ID, the I.D. to be assigned to the path
00000002  2            3) LO_VALUE, the lower status value to be given to the low
00000002  2               level resource
00000002  2            4) LO_MASK, the lower status care/don't care mask to be given
00000002  2               to the low level resource
00000002  2            5) HI_VALUE, the upper status value to be given to the low
00000002  2               level resource
00000002  2            6) HI_MASK, the upper status care/don't care mask to be given
00000002  2               to the low level resource
00000002  2            7) POS_HL_SET, the set of possible high level resources to
00000002  2               use in creating this path
00000002  2            8) LO_ARRAY, the structure describing the current status of
00000002  2               the low level resources
00000002  2            9) HI_ARRAY, the structure describing the current status of
00000002  2               the high level resources
00000002  2    Output:  1) LO_ARRAY, the updated structure describing the current
00000002  2                status of the low level resources
```

```
00000002  2            2) HI_ARRAY, the updated structure describing the current
00000002  2               status of the high level resources
00000002  2            3) the number of the assigned high level resource in
00000002  2               function name, or
00000002  2                -4 indicates out of high level hardware resources
00000002  2                -3 indicates out of low level hardware resources
00000002  2                                                                        *)
00000002  2  VAR
00000002  2
00000002  2    NEXT_LL:  S_INT; (* Next low level resource to be used *)
00000004  2
00000004  2    NEXT_HL:  S_INT; (* Next high level resource to be used *)
000008FA  2
000008FA  2  BEGIN (* Function ASSIGN_PATH *)
000008FA  2    (* Allocate the high level first because it is possible to try
000008FA  2       another POS_HL_SET, in which case you don't want to have already
000008FA  2       allocated a low level resource *)
000008FA  2    NEXT_HL := ASSIGN_HL_RSRC ( POS_HL_SET, HI_ARRAY );
00000910  2    IF NEXT_HL >= 0
00000918  2      THEN (* Found a high level resource and need a low level *)
00000918  2        BEGIN (* Look for a low level resource *)
00000918  2          NEXT_LL := ASSIGN_LL_RSRC ( RSRC_TYPE, PATH_ID, LO_VALUE,
00000918  2                     LO_MASK, HI_VALUE, HI_MASK, LO_ARRAY );
00000944  2          IF NEXT_LL < 0
0000094C  2            THEN (* Out of low level resources *)
0000094C  2              NEXT_HL := NEXT_LL
00000952  2        END; (* Look for a low level resource *)
00000952  2    IF NEXT_HL >= 0
0000095A  2      THEN (* Found all the resources I need *)
0000095A  2        (* Add the low level resource output signals to the inputs of the
0000095A  2           high level resource *)
0000095A  2        MERGE_LL_RSRC ( PATH_ID, LO_ARRAY, HI_ARRAY [ NEXT_HL ] );
0000097E  2    ASSIGN_PATH := NEXT_HL (* Assign final function value *)
00000984  2  END; (* Function ASSIGN_PATH *)
00000000  1  $GLOBPROC OFF$
00000000  1
00000000  1
00000000  1
00000000  1
00000000  1
00000000  1  (*
00000000  1                          **************************
00000000  1                          ***** MERGE_MS_RSRC *****
00000000  1                          **************************
00000000  1                                                                        *)
00000000  1  $GLOBPROC ON$
00000000  1  PROCEDURE MERGE_MS_RSRC ( M_SIG: MISC_DRIVERS; VAR M_ARRAY:
00000000  2                          MISC_ARRAY_TYPE; VAR HL_RSRC: HL_RESOURCE );
00000992  2  (*
00000992  2    Procedure MERGE_MS_RSRC to merge the given miscellaneous signal with
00000992  2    the existing signals already being received by the given high level
00000992  2    resource.  Procedure turns on the misc. signal then merges it into
00000992  2    the high level resource.
00000992  2
00000992  2    Input:  1) M_SIG which miscellaneous resource is to be received
00000992  2               ( either [illegible] )
00000992  2            2) M_ARRAY, the miscellaneous signal array containing M_SIG
00000992  2            3) HL_RSRC, the high level resource who is to merge in the
00000992  2               given miscellaneous signal
00000992  2    Output  1) M_ARRAY, the array containing the updated condition for
00000992  2               for M_SIG
00000992  2            2) HL_RSRC, the updated high level resource description
00000992  2                                                                        *)
00000992  2  BEGIN (* Procedure MERGE_MS_RSRC *)
00000992  2    M_ARRAY [ M_SIG ].CONDITION := ON; (* Turn it on *)
00000998  2    (* Merge it in *)
000009A4  2    HL_RSRC.EXTRA_SET := HL_RSRC.EXTRA_SET + MISC_SET [ M_SIG ]
000009DA  2  END; (* Procedure MERGE_MS_RSRC *)
00000000  1  $GLOBPROC OFF$
00000000  1
00000000  1
00000000  1
00000000  1
00000000  1
```

```
00000000  1  (*
00000000  1                        *******************************
00000000  1                        ***** REVERSE_MS_RSRC *****
00000000  1                        *******************************
00000000  1                                                                         *)
00000000  1  $GLOBPROC ON$
00000000  1  PROCEDURE REVERSE_MS_RSRC ( M_SIG: MISC_DRIVERS; VAR M_ARRAY:
00000000  2                          MISC_ARRAY_TYPE );
000009C2  2  (*
000009C2  2    Procedure REVERSE_MS_RSRC to reverse the logic polarity of a
000009C2  2    miscellaneous signal.
000009C2  2
000009C2  2    REVERSE_MS_RSRC uses the following routine:  CHANGE_POLARITV.
000009C2  2
000009C2  2    Input:  1) M_SIG, which miscellaneous resource is to be reversed
000009C2  2                ( either OCCUR_TERM or EXT_STIM )
000009C2  2            2) M_ARRAY, the miscellaneous signal array containing M_SIG
000009C2  2    Output:  1) M_ARRAY, the array containing the updated condition rec
000009C2  2                for M_SIG
000009C2  2                                                                         *)
000009C2  2  BEGIN (* Procedure REVERSE_MS_RSRC *)
000009C2  2    CHANGE_POLARITY ( M_ARRAY [ M_SIG ] )
000009DA  2  END; (* Procedure REVERSE_MS_RSRC *)
00000000  1  $GLOBPROC OFF$
00000000  1
00000000  1
00000000  1
00000000  1
00000000  1
00000000  1  (*
00000000  1                        *******************************
00000000  1                        ***** ASSIGN_MPATH *****
00000000  1                        *******************************
00000000  1
00000000  1  $GLOBPROC ON$
00000000  1  FUNCTION ASSIGN_MPATH ( MISC_SIG: MISC_DRIVERS; VAR POS_HL_SET:
00000000  2                          HIGH_LEVEL_SET; VAR MISC_ARRAY:
00000000  2                          MISC_ARRAY_TYPE; VAR HI_ARRAY: HL_ARRAY_TYPE ):
00000000  2                          S_INT;
00000002  2  (*
00000002  2    Function ASSIGN_MPATH to allocate the necessary resources to form a
00000002  2    path from the miscellaneous signals to the high level resources.
00000002  2    Function tries to allocate a high level resource.  If that works,
00000002  2    the given miscellaneous signal is incorporated into the input of the
00000002  2    high level resource.
00000002  2
00000002  2    ASSIGN_MPATH uses the following routines:  ASSIGN_HL_RSRC and
00000002  2    MERGE_MS_RSRC.
00000002  2
00000002  2    Input:  1) MISC_SIG, which miscellaneous signal to pass through a
00000002  2                high level resource ( either OCCUR_TERM or EXT_STIM )
00000002  2            2) POS_HL_SET, the set of possible high level resources to
00000002  2                use in creating this path
00000002  2            3) MISC_ARRAY, the structure describing the current status of
00000002  2                the miscellaneous signals
00000002  2            4) HI_ARRAY, the structure describing the current status of
00000002  2                the high level resources
00000002  2    Output:  1) MISC_ARRAY, the updated structure describing the current
00000002  2                status of the miscellaneous signals
00000002  2             2) HI_ARRAY, the updated structure describing the current
00000002  2                status of the high level resources
00000002  2             3) the number of the assigned high level resource in
00000002  2                function name, or
00000002  2                -4 indicates out of high level hardware resources
00000002  2                                                                         *)
00000002  2  VAR
00000002  2
00000002  2    NEXT_HL:  S_INT; (* Next high level resource to be used *)
000009E2  2
000009E2  2  BEGIN (* Function ASSIGN_MPATH *)
000009E2  2    NEXT_HL := ASSIGN_HL_RSRC ( POS_HL_SET, HI_ARRAY );
000009F8  2    IF NEXT_HL >= 0
00000A00  2      THEN (* Found all the resources I need *)
00000A00  2        (* Add the miscellaneous output signal to the inputs of the
00000A00  2           high level resource *)
```

```
00000A00  2       MERGE_MS_RSRC ( MISC_SIG, MISC_ARRAY, HI_ARRAY [ NEXT_HL ] );
00000A24  2    ASSIGN_MPATH := NEXT_HL (* Assign final function value *)
00000A2A  2  END; (* Function ASSIGN_MPATH *)
00000000  1  $GLOBPROC OFF$
00000000  1  .

598: Warning: field or entry alignment, record or array comparisons may not work

End of compilation, number of errors=    0
00000000  1  [illegible]
00000000  1  $EXTENSIONS ON$
00000000  1  $TITLE "Soda Dynamic Controller Additions Manager"
00000000  1  PROGRAM ADD_RSRCS;
00000000  1  (*
00000000  1  ****************************** ADD_RSRCS ******************************
00000000  1    ADD_RSRCS is the module containing all the necessary routines for
00000000  1    additions management in the Soda Dynamic Controller.  Routines for
00000000  1    making additions to measurement specifications, ie function
00000000  1    descriptions, etc, are in this module.  ADD_RSRCS is processor
00000000  1    independent.
00000000  1    Author:  Kip Fulghum
00000000  1    Date:  4-6-83  Revised:  5-9-84
00000000  1  ************************************************************************
00000000  1
00000000  1    ADD_RSRCS contains the following routines:
00000000  1   -Global procedure ADD_OPERAND adds an operand to the given function
00000000  1    generator I/O node's input function description.
00000000  1   -Global procedure ADD_OPERATOR adds an operator to the given function
00000000  1    generator I/O node's input function description.
00000000  1   -Global procedure ADD_PATH creates and adds a low to high level
00000000  1    resource path to the given function generator I/O node's input
00000000  1    function description.
00000000  1   -Global procedure ADD_MPATH creates and adds a misc. signal to high
00000000  1    level resource path to the given function generator I/O node's input
00000000  1    function description.
00000000  1   -Global procedure ADD_OUTPUTS adds a set of output signals to the
00000000  1    given function generator I/O node's output function description.
00000000  1   -Global procedure SET_FEATURE turns on/off a feature signal.
00000000  1
00000000  1   In addition, the following external routines are used:
00000000  1   ASSIGN_PATH and ASSIGN_MPATH.
00000000  1                                                                        *)
00000000  1  (*
00000000  1                          **************************
00000000  1                          ***** Include Files *****
00000000  1                          **************************
00000000  1                                                                        *)
00000000  1
00000000  1  #INCLUDE IR_CONST:SS_DYN
00000000  1
00000000  1  #INCLUDE COM_TYPES:SS_DYN
00000000  1
00000000  1  #INCLUDE LO_TYPES:SS_DYN
00000000  1
00000000  1
00000000  1
00000000  1
00000000  1
00000000  1  (*
00000000  1                           ************************
00000000  1                           ***** ASSIGN_PATH *****
00000000  1                           ************************
00000000  1                                                                        *)
00000000  1  FUNCTION ASSIGN_PATH ( RSRC_TYPE:  LL_TYPE; PATH_ID:  S_INT; LO_VALUE,
00000000  2                         LO_MASK, HI_VALUE, HI_MASK:  L_INT; VAR
00000000  2                         POS_HL_SET:  HIGH_LEVEL_SET; VAR LO_ARRAY:
00000000  2                         LL_ARRAY_TYPE; VAR HI_ARRAY:  HL_ARRAY_TYPE ):
00000000  2                         S_INT; EXTERNAL;
00000000  1  (*
00000000  1    Function ASSIGN_PATH to allocate the necessary resources to form a
00000000  1    path from the low level resources to the high level resources.
00000000  1    Provided as a Pascal external.
00000000  1
00000000  1
```

```
00000000  1
00000000  1
00000000  1
00000000  1
00000000  1   (*
00000000  1                              *************************
00000000  1                              ***** ASSIGN_NPATH *****
00000000  1                              *************************
00000000  1                                                                                  *)
00000000  1   FUNCTION ASSIGN_NPATH ( MISC_SIG:  MISC_DRIVERS; VAR POS_HL_SET:
00000000  2                              HIGH_LEVEL_SET; VAR MISC_ARRAY:
00000000  2                              MISC_ARRAY_TYPE; VAR HI_ARRAY:  HL_ARRAY_TYPE ):
00000000  2                              S_INT; EXTERNAL;
00000000  1   (*
00000000  1     Function ASSIGN_NPATH to allocate the necessary resources to form a
00000000  1     path from the miscellaneous signals to the high level resources.
00000000  1     Provided as a Pascal external.
00000000  1                                                                                  *)
00000000  1
00000000  1
00000000  1
00000000  1
00000000  1
00000000  1   (*
00000000  1                              *************************
00000000  1                              ***** ADD_OPERAND *****
00000000  1                              *************************
00000000  1                                                                                  *)
00000000  1   $GLOBPROC ON$
00000000  1   PROCEDURE ADD_OPERAND ( VAR INPUT:  CONDITION_REC; VAR IO:  I_O_REC;
00000000  2                              VAR CODE:  S_INT );
00000004  2   (*
00000004  2     Procedure ADD_OPERAND to "push" an operand onto a function generator
00000004  2     input function description.  Procedure first checks for function
00000004  2     overflow.  If there is no problem, the given input operand is
00000004  2     added to the function description.
00000004  2
00000004  2     Input:  1) INPUT, the operand to be added to the function
00000004  2                description
00000004  2             2) IO, the I/O node whose input function is to be modified
00000004  2     Output:  1) IO, the I/O node with INPUT added to its input function
00000004  2              2) CODE, a code specifying how the operation turned out:
00000004  2                  -6 indicates function overflow
00000004  2                   0 indicates no error:  operation completed
00000004  2                                                                                  *)
00000004  2   BEGIN (* Procedure ADD_OPERAND *)
00000004  2   IF IO.INPUT_INDEX >= MAX_FUNC_INDEX
00000014  2     THEN (* Function overflow *)
00000014  2       CODE := FUNC_OVERFLOW
00000020  2     ELSE (* It's o.k. to add the term *)
00000020  2       BEGIN (* Add the term *)
00000020  2         IO.INPUT_INDEX := IO.INPUT_INDEX + 1;
0000002E  2         IO.INPUT_ [ IO.INPUT_INDEX ].TAG := OPERAND_;
00000030  2         IO.INPUT_ [ IO.INPUT_INDEX ].OPERAND := INPUT;
00000052  2         CODE := NO_ERROR
0000005E  2       END (* Add the term *)
0000005E  2   END; (* Procedure ADD_OPERAND *)
00000000  1   $GLOBPROC OFF$
00000000  1
00000000  1
00000000  1
00000000  1
00000000  1
00000000  1   (*
00000000  1                              *************************
00000000  1                              ***** ADD_OPERATOR *****
00000000  1                              *************************
00000000  1                                                                                  *)
00000000  1   $GLOBPROC ON$
00000000  1   PROCEDURE ADD_OPERATOR ( INPUT:  ENTRY_TYPE; VAR IO:  I_O_REC;
00000000  2                              VAR CODE:  S_INT );
00000066  2   (*
00000066  2     Procedure ADD_OPERATOR to "push" an operator onto a function generator
00000066  2     input function description.  Procedure first checks for function
```

```
00000066  2    overflow.  If there is no problem, the given input operator is
00000066  2    added to the function description.
00000066  2
00000066  2    Input:  1) INPUT, the operator to be added to the function
00000066  2               description
00000066  2            2) IO, the I/O node whose input function is to be modified
00000066  2    Output:  1) IO, the I/O node with INPUT added to its input function
00000066  2             2) CODE, a code specifying how the operation turned out:
00000066  2                -6 indicates function overflow
00000066  2                 0 indicates no error:  operation completed
00000066  2                                                                        *)
00000066  2  BEGIN (* Procedure ADD_OPERATOR *)
00000066  2  IF IO.INPUT_INDEX >= MAX_FUNC_INDEX
00000076  2    THEN (* Function overflow *)
00000076  2      CODE := FUNC_OVERFLOW
00000082  2    ELSE (* It's o.k. to add the term *)
00000082  2      BEGIN (* Add the term *)
00000082  2        IO.INPUT_INDEX := IO.INPUT_INDEX + 1;
00000090  2        IO.INPUT_ [ IO.INPUT_INDEX ].TAG := INPUT;
000000A0  2        CODE := NO_ERROR
000000A6  2      END (* Add the term *)
000000A6  2  END; (* Procedure ADD_OPERATOR *)
00000000  1  $GLOBPROC OFF$
00000000  1
00000000  1
00000000  1
00000000  1
00000000  1
00000000  1  (*
00000000  1                              ********************
00000000  1                              ***** ADD_PATH *****
00000000  1                              ********************
00000000  1                                                                        *)
00000000  1  $GLOBPROC ON$
00000000  1  PROCEDURE ADD_PATH ( RSRC_TYPE:  LL_TYPE; PATH_ID:  S_INT; LO_VALUE,
00000000  2                       LO_MASK, HI_VALUE, HI_MASK:  L_INT; VAR
00000000  2                       POS_HL_SET:  HIGH_LEVEL_SET; VAR LO_ARRAY:
00000000  2                       LL_ARRAY_TYPE; VAR HI_ARRAY:  HL_ARRAY_TYPE;
00000000  2                       VAR IO:  I_O_REC; VAR CODE:  S_INT );
000000AE  2  (*
000000AE  2    Procedure ADD_PATH to create and add a low to high level resource
000000AE  2    path to the given function generator I/O node's input function
000000AE  2    description.  Procedure first creates the path.  If that works, the
000000AE  2    assigned high level resource is added to the input function
000000AE  2    description.
000000AE  2
000000AE  2    ADD_PATH uses the following routines:  ASSIGN_PATH and ADD_OPERAND
000000AE  2
000000AE  2    Input:  1) RSRC_TYPE, the type of low level resource desired
000000AE  2            2) PATH_ID, the I.D. to be assigned to the path
000000AE  2            3) LO_VALUE, the lower status value to be given to the low
000000AE  2               level resource
000000AE  2            4) LO_MASK, the lower status care/don't care mask to be given
000000AE  2               to the low level resource
000000AE  2            5) HI_VALUE, the upper status value to be given to the low
000000AE  2               level resource
000000AE  2            6) HI_MASK, the upper status care/don't care mask to be given
000000AE  2               to the low level resource
000000AE  2            7) POS_HL_SET, the set of possible high level resources to
000000AE  2               use in creating this path
000000AE  2            8) LO_ARRAY, the structure describing the current status of
000000AE  2               the low level resources
000000AE  2            9) HI_ARRAY, the structure describing the current status of
000000AE  2               the high level resources
000000AE  2           10) IO, the I/O node whose input function is to be modified
000000AE  2    Output   1) LO_ARRAY, the updated structure describing the current
000000AE  2               status of the low level resources
000000AE  2             2) HI_ARRAY, the updated structure describing the current
000000AE  2               status of the high level resources
000000AE  2             3) IO, the I/O node with the created path added to its input
000000AE  2               funtion
000000AE  2             4) CODE, a code specifying how the add turned out:
000000AE  2                -6 indicates function overflow
000000AE  2                -4 indicates out of high level hardware resources
000000AE  2                -2 indicates out of low level hardware resources
000000AE  2                 0 indicates no error:  operation completed
000000AE  2                                                                        *)
```

```
000000AE  2  BEGIN (* Procedure ADD_PATH *)
000000AE  2    (* Get a resource path *)
000000AE  2    CODE := ASSIGN_PATH ( RSRC_TYPE, PATH_ID, LO_VALUE, LO_MASK,
000000AE  2                          HI_VALUE, HI_MASK, POS_HL_SET, LO_ARRAY,
000000AE  2                          HI_ARRAY );
000000E9  2    IF CODE >= 0
000000F2  2      THEN (* Path is available *)
000000F2  2        (* Add high level resource term to input function *)
000000F2  2        ADD_OPERAND ( HI_ARRAY [ CODE ].HL_OUTPUT, IO, CODE )
0000011E  2  END; (* Procedure ADD_PATH *)
00000000  1  $GLOBPROC OFF$
00000000  1
00000000  1
00000000  1
00000000  1
00000000  1
00000000  1  (*
00000000  1                          ************************
00000000  1                          ***** ADD_MPATH *****
00000000  1                          ************************
00000000  1                                                                   *)
00000000  1  $GLOBPROC ON$
00000000  1  PROCEDURE ADD_MPATH ( MISC_SIG:  MISC_DRIVERS; VAR POS_HL_SET:
00000000  2                        HIGH_LEVEL_SET; VAR MISC_ARRAY:  MISC_ARRAY_TYPE,
00000000  2                        VAR HI_ARRAY:  HL_ARRAY_TYPE; VAR IO:  I_O_REC.
00000000  2                        VAR CODE:  S_INT );
00000126  2  (*
00000126  2    Procedure ADD_MPATH to create and add a misc. signal to high level
00000126  2    resource path to the given function generator I/O node's input
00000126  2    function description.  Procedure first creates the path.  If that
00000126  2    works, the assigned high level resource is added to the input function
00000126  2    description.
00000126  2
00000126  2    ADD_MPATH uses the following routines:  ASSIGN_MPATH and ADD_OPERAND.
00000126  2
00000126  2    Input:  1) MISC_SIG, which miscellaneous signal to pass through a
00000126  2               high level resource ( either OCCUR_TERM or EXT_STIM )
00000126  2            2) POS_HL_SET, the set of possible high level resources to
00000126  2               use in creating this path
00000126  2            3) MISC_ARRAY, the structure describing the current status of
00000126  2               the miscellaneous signals
00000126  2            4) HI_ARRAY, the structure describing the current status of
00000126  2               the high level resources
00000126  2            5) IO, the I/O node whose input function is to be modified
00000126  2    Output:  1) MISC_ARRAY, the updated structure describing the current
00000126  2                status of the miscellaneous signals
00000126  2             2) HI_ARRAY, the updated structure describing the current
00000126  2                status of the high level resources
00000126  2             3) IO, the I/O node with the created path added to its input
00000126  2                function
00000126  2             4) CODE, a code specifying how the add turned out:
00000126  2                  -6 indicates function overflow
00000126  2                  -4 indicates out of high level hardware resources
00000126  2                   0 indicates no error:  operation completed
00000126  2                                                                   *)
00000126  2  BEGIN (* Procedure ADD_MPATH *)
00000126  2    (* Get a resource path *)
00000126  2    CODE := ASSIGN_MPATH ( MISC_SIG, POS_HL_SET, MISC_ARRAY,
00000126  2                           HI_ARRAY );
0000014C  2    IF CODE >= 0
00000156  2      THEN (* Path is available *)
00000156  2        (* Add high level resource term to input function *)
00000156  2        ADD_OPERAND ( HI_ARRAY [ CODE ].HL_OUTPUT, IO, CODE )
00000182  2  END; (* Procedure ADD_MPATH *)
00000000  1  $GLOBPROC OFF$
00000000  1
00000000  1
00000000  1
00000000  1
00000000  1
00000000  1
00000000  1  (*
```

```
00000000  1                          ************************
00000000  1                          ****** ADD_OUTPUTS *****
00000000  1                          ************************
00000000  1                                                                   *)
00000000  1  $GLOBPROC ON$
00000000  1  PROCEDURE ADD_OUTPUTS ( OUTPUT_SET:  OUT_SET_TYPE; VAR IO:  I_O_REC );
00000000  2  (*
00000000  2    Procedure ADD_OUTPUTS to add a set of output signals to the given
00000000  2    function generator I/O node's output function description.  Procedure
00000000  2    looks at all possible output signals, then turns them on if they are
00000000  2    in the given set.
00000000  2
00000000  2    Input:  1) OUTPUT_SET, the set of output signals to turn on in IOs
00000000  2               output signals
00000000  2            2) IO, the I/O node whose output signals are to be modified
00000000  2    Output:  1) IO, the I/O node with the given output signals added to
00000000  2                it
00000000  2                                                                   *)
00000000  2  VAR
00000000  2
00000000  2    I:  OUTPUT_FUNCTIONS; (* FOR loop index *)
0000013A  2
0000013A  2  BEGIN (* Procedure ADD_OUTPUTS *)
0000013A  2    FOR I := START_QUAL TO O_FB_3 DO
0000013E  2      IF I IN OUTPUT_SET
000001A6  2        THEN (* This guy needs to be turned on *)
000001A6  2          IO.OUTPUT_ [ I ].CONDITION := ON
000001CC  2  END; (* Procedure ADD_OUTPUTS *)
00000000  1  $GLOBPROC OFF$
00000000  1
00000000  1
00000000  1
00000000  1
00000000  1
00000000  1  (*
00000000  1                          ************************
00000000  1                          ***** SET_FEATURE *****
00000000  1                          ************************
00000000  1                                                                   *)
00000000  1  $GLOBPROC ON$
00000000  1  PROCEDURE SET_FEATURE ( ON_OFF:  CONDITION_TYPE; VAR FEAT_SIG:
00000000  2                          FEATURE_REC );
000001D4  2  (*
000001D4  2    Procedure SET_FEATURE to turn on/off a feature signal.  Procedure
000001D4  2    simply assigns the passed ON_OFF value to the signal's current
000001D4  2    condition.
000001D4  2
000001D4  2    Input:  1) ON_OFF, the condition to set the signal, ON or OFF
000001D4  2            2) FEAT_SIG, a record describing the feature signal
000001D4  2    Output:  1) FEAT_SIG, the updated feature record turned on/off
000001D4  2                                                                   *)
000001D4  2  BEGIN (* Procedure SET_FEATURE *)
000001D4  2    FEAT_SIG.STATUS.CONDITION := ON_OFF
000001DE  2  END; (* Procedure SET_FEATURE *)
00000000  1  $GLOBPROC OFF$
00000000  1  .

508: Warning: field or entry alignment; record or array comparisons may not work

End of compilation, number of errors=    0
00000000  1  "68000" PREPROCESS
00000000  1  $EXTENSIONS ON$
00000000  1  $LIST_ABS_LONG$
00000000  1  $TITLE "Soda Dynamic Controller Specification Manager"
00000000  1  PROGRAM SPEC_RSRCS;
00000000  1  (*
00000000  1  ********************************** SPEC_RSRCS ****************************************
00000000  1    SPEC_RSRCS is the module containing all the necessary routines for
00000000  1    measurement specification management in the Soda Dynamic Controller.
00000000  1    Routines for allocating/modifying measurement specifications, states,
00000000  1    and I/O conditions are located right here.  SPEC_RSRCS is processor
00000000  1    independent.
00000000  1    Author:  Kip Fulghum
00000000  1    Date:  3-28-83  Revised:  11-7-84
00000000  1  *************************************************************************************
00000000  1
```

```
00000000  1    SPEC_RSRCS contains the following routines:
00000000  1    -Global function ASSIGN_STATE creates a new state node for the
00000000  1     function generators data structure.
00000000  1    -Global function ASSIGN_IO creates a new I/O node for the function
00000000  1     generators data structure.
00000000  1    -Global function ASSIGN_FSTATE creates a new state node for the
00000000  1     fast sequencer data structure.
00000000  1    -Global function ASSIGN_FIO creates a new I/O node for the fast
00000000  1     sequencer data structure.
00000000  1    -Global function GET_NEXT_SPEC searches through the linked list of
00000000  1     trace specifications and finds the one with the highest priority
00000000  1     ready to go.
00000000  1    -Global procedure SET_SPEC sets the status of a trace specification.
00000000  1    -Procedure LOW_INIT initializes the low level resource data structure
00000000  1    -Procedure HIGH_INIT initializes the high level resource data
00000000  1     structure.
00000000  1    -Procedure FAST_INIT initializes the fast sequencer data structure.
00000000  1    -Procedure FUNC_INIT initializes the function generator data
00000000  1     structure.
00000000  1    -Procedure MISC_INIT initializes the misc. signal data structure.
00000000  1    -Procedure FEAT_INIT initializes the feature array data structure.
00000000  1    -Global function ASSIGN_SPEC creates a new trace specification node
00000000  1     for the Dynamic Controller.
00000000  1                                                                    *)
00000000  1  (*
00000000  1                         *************************
00000000  1                         ***** Include Files *****
00000000  1                         *************************
00000000  1                                                                    *)
00000000  1
00000000  1  $INCLUDE CGM_TYPES:SS_DYN
00000000  1
00000000  1  $INCLUDE LD_TYPES:SS_DYN
00000000  1
00000000  1  VAR
00000000  1  .
00000000  1  $EXTVAR ON$
00000000  1
00000000  1    TRACE_HEAD:  TRACE_SPEC_PTR; (* Pointer to beginning of trace
00000000  1                                    specification list *)
00000000  1
00000000  1  $EXTVAR OFF$
00000000  1
00000000  1
00000000  1
00000000  1
00000000  1
00000000  1  (*
00000000  1                         *************************
00000000  1                         ***** ASSIGN_STATE *****
00000000  1                         *************************
00000000  1                                                                    *)
00000000  1  $GLOBPROC ON$
00000000  1  FUNCTION ASSIGN_STATE ( CUR_STATE:  STATE_TYPE ):  STATE_REC_PTR;
00000004  2  (*
00000004  2    Function ASSIGN_STATE to create a new state node for the function
00000004  2    generators data structure.  Function NEWs the node, then initializes
00000004  2    all necessary fields.
00000004  2
00000004  2    Input:  1) CUR_STATE, the current state number
00000004  2    Output:  1) a pointer to the new, initialized state node, in
00000004  2               function name
00000004  2                                                                    *)
00000004  2  VAR
00000004  2
00000004  2    STATE:  STATE_REC_PTR; (* Pointer to new state node *)
00000004  2
00000004  2  BEGIN (* Function ASSIGN_STATE *)
00000004  2    NEW ( STATE ); (* Create new state node *)
00000016  2    (* Initialize fields in this state node *)
00000016  2    STATE^.NEXT_STATE_PTR := NIL;
0000001C  2    STATE^.CUR_STATE := CUR_STATE;
00000026  2    STATE^.I_O_PTR := NIL;
0000002E  2    ASSIGN_STATE := STATE (* Return pointer to initialized state node *)
00000034  2  END; (* Function ASSIGN_STATE *)
00000000  1  $GLOBPROC OFF$
```

```
00000000  1
00000000  1
00000000  1
00000000  1
00000000  1
00000000  1  (*
00000000  1                          **********************
00000000  1                          ***** ASSIGN_IO *****
00000000  1                          **********************
00000000  1                                                                     *)
00000000  1  $GLOBPROC ON$
00000000  1  FUNCTION ASSIGN_IO ( NEXT_STATE:  STATE_TYPE ):  I_O_REC_PTR;
00000004  2  (*
00000004  2    Function ASSIGN_IO to create a new I/O node for the function
00000004  2    generators data structure.  Function NEWs the node, then initializes
00000004  2    all necessary fields.
00000004  2
00000004  2    Input:  1) NEXT_STATE, the state number of the next state
00000004  2    Output:  1) a pointer to the new, initialized I/O node, in
00000004  2                function name
00000004  2                                                                     *)
00000004  2  VAR
00000004  2
00000004  2    IO:  I_O_REC_PTR; (* Pointer to new I/O node *)
00000008  2
00000008  2    I:  OUTPUT_FUNCTIONS; (* FOR loop index *)
00000040  2
00000040  2  BEGIN (* Function ASSIGN_IO *)
00000040  2    NEW ( IO ); (* Create new I/O node *)
00000052  2    (* Initialize fields in this I/O node *)
00000052  2    IO^.INPUT_ [ 0 ].TAG := END_;
00000058  2    IO^.INPUT_INDEX := -1;
00000064  2    FOR I := START_QUAL TO Q_FD_3 DO
00000063  2      IO^.OUTPUT_ [ I ].CONDITION := OFF;
00000090  2    IO^.NEXT_STATE := NEXT_STATE;
00000098  2    IO^.NEXT_I_O_PTR := NIL;
000000A2  2    ASSIGN_IO := IO (* Return pointer to initialized I/O node *)
000000A8  2  END; (* Function ASSIGN_IO *)
00000000  1  $GLOBPROC OFF$
00000000  1
00000000  1
00000000  1
00000000  1
00000000  1
00000000  1  (*
00000000  1                        **************************
00000000  1                        ***** ASSIGN_FSTATE *****
00000000  1                        **************************
00000000  1                                                                     *)
00000000  1  $GLOBPROC ON$
00000000  1  FUNCTION ASSIGN_FSTATE ( CUR_STATE:  STATE_TYPE ):  FSTATE_REC_PTR;
00000004  2  (*
00000004  2    Function ASSIGN_FSTATE to create a new state node for the fast
00000004  2    sequencer data structure.  Function NEWs the node, then initializes
00000004  2    all necessary fields.
00000004  2
00000004  2    Input:  1) CUR_STATE, the current state number
00000004  2    Output:  1) a pointer to the new, initialized state node, in
00000004  2                function name
00000004  2                                                                     *)
00000004  2  VAR
00000004  2
00000004  2    STATE:  FSTATE_REC_PTR; (* Pointer to new state node *)
000000B4  2
000000B4  2  BEGIN (* Function ASSIGN_FSTATE *)
000000B4  2    NEW ( STATE ); (* Create new state node *)
000000C6  2    (* Initialize fields in this state node *)
000000C6  2    STATE^.NEXT_STATE_PTR := NIL;
000000CC  2    STATE^.CUR_STATE := CUR_STATE;
000000D6  2    STATE^.I_O_PTR := NIL;
000000DE  2    ASSIGN_FSTATE := STATE (* Return pointer to initialized state node *)
000000E4  2  END; (* Function ASSIGN_FSTATE *)
00000000  1  $GLOBPROC OFF$
00000000  1
```

```
00000000  1
00000000  1
00000000  1
00000000  1
00000000  1  (*
00000000  1                          *************************
00000000  1                          ***** ASSIGN_FIO *****
00000000  1                          *************************
00000000  1                                                                    *)
00000000  1  $GLOBPROC ON$
00000000  1  FUNCTION ASSIGN_FIO ( NEXT_STATE:  STATE_TYPE ):  FI_O_REC_PTR;
00000004  2  (*
00000004  2    Function ASSIGN_FIO to create a new I/O node for the fast
00000004  2    sequencer data structure.  Function NEWs the node, then initializes
00000004  2    all necessary fields.
00000004  2
00000004  2    Input:  1) NEXT_STATE, the state number of the next state
00000004  2    Output:  1) a pointer to the new, initialized I/O node, in
00000004  2                function name
00000004  2                                                                    *)
00000004  2  VAR
00000004  2
00000004  2    IO:  FI_O_REC_PTR; (* Pointer to new I/O node *)
00000008  2
00000008  2    I:  FOUTPUT_FUNCTIONS; (* FOR loop index *)
000000F0  2
000000F0  2  BEGIN (* Function ASSIGN_FIO *)
000000F0  2    NEW ( IO ); (* Create new I/O node *)
00000102  2    (* Initialize fields in this I/O node *)
00000102  2    IO^.INPUT_ [ 0 ].TAG := END_;
0000010A  2    IO^.INPUT_INDEX := -1;
00000114  2    FOR I := STORE_FSR TO FSRV DO
00000118  2      IO^.OUTPUT_ [ I ].CONDITION := OFF;
00000140  2    IO^.NEXT_STATE := NEXT_STATE;
0000014A  2    IO^.NEXT_I_O_PTR := NIL;
00000152  2    ASSIGN_FIO := IO (* Return pointer to initialized I/O node *)
00000158  2  END; (* Function ASSIGN_FIO *)
00000000  1  $GLOBPROC OFF$
00000000  1
00000000  1
00000000  1
00000000  1
00000000  1
00000000  1  (*
00000000  1                          ***************************
00000000  1                          ***** GET_NEXT_SPEC *****
00000000  1                          ***************************
00000000  1                                                                    *)
00000000  1  $GLOBPROC ON$
00000000  1  FUNCTION GET_NEXT_SPEC:  TRACE_SPEC_PTR;
00000004  2  (*
00000004  2    Function GET_NEXT_SPEC to search through the linked list of
00000004  2    trace specifications and find the one with the highest priority
00000004  2    ( LOWEST numerical value ) ready to go.
00000004  2
00000004  2    NOTE:  this function does not and cannot set any fields in
00000004  2    the trace spec it finds.  This is because the routine is often used
00000004  2    just to find out what the next spec is and not to use the spec just
00000004  2    yet.
00000004  2
00000004  2    Input:  none - the global TRACE_HEAD is taken to be the pointer to
00000004  2                   the beginning of the trace spec list
00000004  2    Output:  1) pointer to trace specification with highest priority ready
00000004  2                to go or NIL if no spec is ready, in function name
00000004  2                                                                    *)
00000004  2  VAR
00000004  2
00000004  2    CUR_PTR:  TRACE_SPEC_PTR; (* Pointer to current spec being checked *)
00000008  2
00000008  2    HIGHEST_PRI:  S_INT; (* Highest spec priority so far *)
0000000A  2
0000000A  2    HIGHEST_PTR:  TRACE_SPEC_PTR; (* Pointer to highest so far *)
00000164  2
00000164  2  BEGIN (* Function GET_NEXT_SPEC *)
00000164  2    CUR_PTR := TRACE_HEAD; (* Start at head of list *)
```

```
00000164  2     HIGHEST_PRI := 17; (* Lowest possible spec is lo- measurement *)
00000170  2     HIGHEST_PTR := NIL;
00000174  2     WHILE CUR_PTR <> NIL DO
0000017C  2       BEGIN (* Find highest priority specification *)
0000017C  2         IF ( CUR_PTR^.STATUS = READY ) AND
0000017C  2            ( CUR_PTR^.PRIORITY < HIGHEST_PRI )
000001A0  2           THEN (* Found a higher priority spec *)
000001A0  2             BEGIN (* Update current spec *)
000001A0  2               HIGHEST_PTR := CUR_PTR;
000001A6  2               HIGHEST_PRI := CUR_PTR^.PRIORITY
0000019E  2             END; (* Update current spec *)
000001AE  2         CUR_PTR := CUR_PTR^.NEXT_SPEC (* Move to next specification *)
000001B8  2       END; (* Find highest priority specification *)
000001BA  2     GET_NEXT_SPEC := HIGHEST_PTR (* Assign final function value *)
000001C0  2   END; (* Function GET_NEXT_SPEC *)
00000000  1   $GLOBPROC OFF$
00000000  1
00000000  1
00000000  1
00000000  1
00000000  1
00000000  1   (*
00000000  1                            ***********************
00000000  1                            ***** SET_SPEC *****
00000000  1                            ***********************
00000000  1                                                                          *)
00000000  1   $GLOBPROC ON$
00000000  1   PROCEDURE SET_SPEC ( PRI:  S_INT; SET_STATUS:  SPEC_STATUS );
00000000  2   (*
00000000  2     Procedure SET_SPEC to set the status of a trace specification.
00000000  2     Procedure searches the spec list for a spec with the given priority,
00000000  2     then sets its status to the given status.  If there are no specs
00000000  2     which fit the bill, nothing happens.
00000000  2
00000000  2     Input:  1) PRI, the specification's priority
00000000  2             2) SET_STATUS, the status to give to the spec
00000000  2             Also, the global TRACE_HEAD is taken to be the pointer to
00000000  2             the beginning of the trace spec list
00000000  2     Output:  none - the appropriate spec is adjusted per request
00000000  2                                                                          *)
00000000  2   VAR
00000000  2
00000000  2     CUR_PTR:  TRACE_SPEC_PTR; (* Pointer to current spec being checked *)
000001CC  2
000001CC  2   BEGIN (* Procedure SET_SPEC *)
000001CC  2     CUR_PTR := TRACE_HEAD; (* Start at head of list *)
000001D2  2     WHILE CUR_PTR <> NIL DO
000001DA  2       BEGIN (* Find spec to set status *)
000001DA  2         IF CUR_PTR^.PRIORITY = PRI
000001E8  2           THEN (* Found a spec matching that descripiton *)
000001E8  2             BEGIN (* Set this spec's status *)
000001E8  2               CUR_PTR^.STATUS := SET_STATUS;
000001F2  2               IF SET_STATUS = FINISHED
000001FE  2                 THEN (* Done with this spec *)
000001FE  2                   BEGIN (* Reset dirty flags *)
000001FE  2                     CUR_PTR^.HW_SPEC.RSRC_DIRTY := TRUE;
00000208  2                     CUR_PTR^.HW_SPEC.RAM_DIRTY := TRUE
00000212  2                   END (* Reset dirty flags *)
00000212  2             END; (* Set this spec's status *)
00000212  2         CUR_PTR := CUR_PTR^.NEXT_SPEC (* Move to next specification *)
0000021C  2       END (* Find spec to set status *)
0000021C  2   END; (* Procedure SET_SPEC *)
00000000  1   $GLOBPROC OFF$
00000000  1
00000000  1
00000000  1
00000000  1
00000000  1
00000000  1   (*
00000000  1                            ***********************
00000000  1                            ***** LOW_INIT *****
00000000  1                            ***********************
00000000  1                                                                          *)
00000000  1   PROCEDURE LOW_INIT ( VAR LL_ARRAY:  LL_ARRAY_TYPE );
00000000  2   (*
```

```
00000000  2    Procedure LOW_INIT to initialize the low level resource data
00000000  2    structure.  Procedure loops through the low level resource data
00000000  2    structure, initializing all types, load pointers, trace I.D.s.
00000000  2    setting all masks and logic polarities for all the low level
00000000  2    resources.
00000000  2
00000000  2    Input:  1) LL_ARRAY, the low level array data structure describing
00000000  2               the low level resources
00000000  2    Output:  1) LL_ARRAY, the initialized low level array
00000000  2                                                                      *)
00000000  2  VAR
00000000  2
00000000  2    I:  LL_RESOURCE_NUM; (* FOR loop index *)
00000001  2
00000001  2    CUR_PTR:  L_INT; (* Current load pointer *)
00000006  2
00000006  2    CUR_MASK:  L_INT; (* Currrent resource mask *)
00000226  2
00000226  2  BEGIN (* Procedure LOW_INIT *)
00000226  2    (* Set up resource type *)
00000226  2     LL_ARRAY [ 0 ].RESOURCE_TYPE := ADDRESS_EQUATE;
0000022E  2     LL_ARRAY [ 1 ].RESOURCE_TYPE := OPCODE_EQUATE;
00000238  2     LL_ARRAY [ 2 ].RESOURCE_TYPE := DATA_EQUATE;
00000240  2     LL_ARRAY [ 3 ].RESOURCE_TYPE := DATA_EQUATE;
00000248  2     LL_ARRAY [ 4 ].RESOURCE_TYPE := DATA_EQUATE;
00000250  2     LL_ARRAY [ 5 ].RESOURCE_TYPE := DATA_EQUATE;
00000258  2     LL_ARRAY [ 6 ].RESOURCE_TYPE := DATA_RANGE;
00000262  2     LL_ARRAY [ 7 ].RESOURCE_TYPE := DATA_RANGE;
0000026C  2     LL_ARRAY [ 8 ].RESOURCE_TYPE := ADDRESS_RANGE;
00000276  2     LL_ARRAY [ 9 ].RESOURCE_TYPE := ADDRESS_RANGE;
00000280  2     LL_ARRAY [ 10 ].RESOURCE_TYPE := ADDRESS_RANGE;
0000028A  2     LL_ARRAY [ 11 ].RESOURCE_TYPE := ADDRESS_RANGE;
00000294  2    (* Initialize load pointer and bit mask for low level resources *)
00000294  2    CUR_PTR := 200000H;
0000029C  2    CUR_MASK := 0004H;
000002A4  2    FOR I := 0 TO MAX_LL_RESOURCES-1 DO
000002B8  2      WITH LL_ARRAY [ I ] DO
000002BE  2        BEGIN (* Initialize portions of the low level resource records *)
000002BE  2          (* Set up resource load location *)
000002BE  2          LOAD_PTR := VALUE_MASK_PTR ( CUR_PTR );
000002C4  2          (* Initialize trace I.D.s *)
000002C4  2          LO_TRACE_ID := -1;
000002CE  2          HI_TRACE_ID := -1;
000002D8  2          (* Set up initial RME masks/values to don't care *)
000002D8  2          LO_BOUND_MASK := 0;
000002E0  2          LO_BOUND_VALUE := 0FFFFFFFFH;
000002EC  2          HI_BOUND_MASK := 0;
000002F4  2          HI_BOUND_VALUE := 0FFFFFFFFH;
00000300  2          (* Initialize all signals to off *)
00000300  2          LL_OUTPUT [ GE_LO ].CONDITION := OFF; (* Not used for equates *)
0000030C  2          LL_OUTPUT [ EQ_LO ].CONDITION := OFF;
00000318  2          LL_OUTPUT [ EQ_HI ].CONDITION := OFF; (* Not used for equates *)
00000328  2          LL_OUTPUT [ LE_HI ].CONDITION := OFF; (* Not used for equates *)
00000336  2          (* Set up signal polarities and masks *)
00000336  2          LL_OUTPUT [ GE_LO ].TRUE_POLARITY := HIGH; (* Only for ranges *)
00000342  2          LL_OUTPUT [ EQ_LO ].TRUE_POLARITY := LOW,
00000354  2          LL_OUTPUT [ EQ_HI ].TRUE_POLARITY := LOW; (* Only for ranges *)
00000366  2          LL_OUTPUT [ LE_HI ].TRUE_POLARITY := HIGH; (* Only for ranges *)
00000376  2          IF ( RESOURCE_TYPE = ADDRESS_RANGE ) OR ( RESOURCE_TYPE =
00000376  2              DATA_RANGE )
00000396  2            THEN (* Ranges take a double load location *)
00000396  2              BEGIN (* Move load location, bit mask after range *)
00000396  2                LL_OUTPUT [ GE_LO ].MASK := SHIFT ( CUR_MASK, 2 );
000003A4  2                LL_OUTPUT [ EQ_LO ].MASK := SHIFT ( CUR_MASK, 3 );
000003BA  2                LL_OUTPUT [ EQ_HI ].MASK := CUR_MASK;
000003CC  2                LL_OUTPUT [ LE_HI ].MASK := SHIFT ( CUR_MASK, 1 );
000003E2  2                CUR_PTR := CUR_PTR + 10H;
000003EA  2                CUR_MASK := SHIFT ( CUR_MASK, 4 )
000003F4  2              END (* Move load location, bit mask after range *)
000003F8  2            ELSE (* Equates take a single load location *)
000003F8  2              BEGIN (* Move load location, bit mask after equate *)
000003F8  2                LL_OUTPUT [ GE_LO ].MASK := 0; (* Not used *)
00000404  2                IF ODD ( I ) = TRUE
00000410  2                  THEN (* Adjust mask to the right *)
```

```
00000418  2                    LL_OUTPUT [ EQ_LO ].MASK := SHIFT ( CUR_MASK, -1 )
00000432  2                  ELSE (* Adjust mask to the left *)
00000432  2                    LL_OUTPUT [ EQ_LO ].MASK := SHIFT ( CUR_MASK, 1 );
00000449  2                LL_OUTPUT [ EQ_HI ].MASK := 0; (* Not used *)
00000458  2                LL_OUTPUT [ LE_HI ].MASK := 0; (* Not used *)
00000468  2                CUR_PTR := CUR_PTR + 8H;
0000046C  2                CUR_MASK := SHIFT ( CUR_MASK, 1 )
00000476  2              END (* Move load location, bit mask after equate *)
00000476  2          END; (* Initialize portions of the low level resource records *)
00000488  2    (* 11 was set up incorrectly:  special case 11's address *)
00000488  2    LL_ARRAY [ 11 ].LOAD_PTR := VALUE_MASK_PTR ( 21000OH )
00000498  2  END; (* Procedure LOW_INIT *)
00000000  1
00000000  1
00000000  1
00000000  1
00000000  1
00000000  1  (*
00000000  1                           **********************
00000000  1                           ***** HIGH_INIT *****
00000000  1                           **********************
00000000  1
00000000  1  PROCEDURE HIGH_INIT ( VAR HL_ARRAY:  HL_ARRAY_TYPE );
00000000  2  (*
00000000  2    Procedure HIGH_INIT to initialize the high level resource data
00000000  2    structure.  Procedure loops through the high level resource data
00000000  2    structure, initializing all load pointers, low level and misc.
00000000  2    resource inputs to empty, logic polarities, output masks, and
00000000  2    current conditions.
00000000  2
00000000  2    Input:  1) HL_ARRAY, the high level array data structure describing
00000000  2               the high level resources
00000000  2    Output:  1) HL_ARRAY, the initialized high level array
00000000  2                                                                            *)
00000000  2  VAR
00000000  2
00000000  2    I:  HL_RESOURCE_NUM; (* FOR loop index *)
00000001  2
00000001  2    J:  LL_SIGNALS; (* FOR loop index *)
00000002  2
00000002  2    CUR_PTR:  L_INT; (* Current load pointer *)
00000006  2
00000006  2    CUR_MASK:  L_INT; (* Currrent resource mask *)
000004A0  2
000004A0  2  BEGIN (* Procedure HIGH_INIT *)
000004A0  2    (* Initialize load pointer and bit mask for high level resources *)
000004A0  2    CUR_PTR := 210010H;
000004A8  2    CUR_MASK := 0002H;
000004B0  2    FOR I := 0 TO MAX_HL_RESOURCES-1 DO
000004B4  2      WITH HL_ARRAY [ I ] DO
000004C8  2        BEGIN (* Initialize portions of the high level resource records *)
000004C8  2          (* Set up resource load location *)
000004C8  2          LOAD_PTR := VALUE_MASK_PTR ( CUR_PTR );
000004CE  2          (* Initialize input sets *)
000004CE  2          FOR J := GE_LO TO LE_HI DO
000004D2  2            LL_SETS [ J ] := [];
000004F6  2          EXTRA_SET := [];
000004FE  2          HL_OUTPUT.CONDITION := OFF;
00000508  2          HL_OUTPUT.TRUE_POLARITY := LOW;
00000512  2          IF ODD ( I ) = TRUE
00000526  2            THEN (* Adjust mask to the right *)
00000526  2              HL_OUTPUT.MASK := SHIFT ( CUR_MASK, -1 )
00000538  2            ELSE (* Adjust mask to the left *)
00000538  2              HL_OUTPUT.MASK := SHIFT ( CUR_MASK, 1 );
00000546  2          CUR_PTR := CUR_PTR + 8H;
0000054A  2          CUR_MASK := SHIFT ( CUR_MASK, 1 );
00000554  2          IF I = 3
00000560  2            THEN (* Start mask over for remaining resources *)
00000560  2              CUR_MASK := 0002H
00000568  2        END (* Initialize portions of the high level resource records *)
0000057A  2  END; (* Procedure HIGH_INIT *)
00000000  1
00000000  1
00000000  1
```

```
00000000  1
00000000  1
00000000  1  (*
00000000  1                        *********************
00000000  1                        ***** FAST_INIT *****
00000000  1                        *********************
00000000  1                                                                  *)
00000000  1  PROCEDURE FAST_INIT ( VAR FAST_SQR:  FSR_REC_TYPE );
00000000  2  (*
00000000  2    Procedure FAST_INIT to initialize the fast sequencer data structure.
00000000  2    Procedure sets up the load address, control values, output bit
00000000  2    patterns and bit masks for the fast sequencer.
00000000  2
00000000  2    Input:  1) FAST_SQR, the fast sequencer data structure describing
00000000  2               the fast sequencer
00000000  2    Output:  1) FAST_SQR, the initialized fast sequencer data structure
00000000  2                                                                  *)
00000000  2  VAR
00000000  2
00000000  2    I:  FSR_LL_TYPE; (* FOR loop index *)
00000001  2
00000001  2    J:  FOUTPUT_FUNCTIONS; (* FOR loop index *)
00000002  2
00000002  2    CUR_MASK:  L_INT; (* Current resource mask *)
00000582  2
00000582  2  BEGIN (* Procedure FAST_INIT *)
00000582  2    (* Initialize part of X function generator record *)
00000582  2    FAST_SQR.LOAD_PTR := 406000H;
0000058C  2    FAST_SQR.OFF_VALUE := 000007C1H;
00000598  2    FAST_SQR.RAM_0_ADRS_MASK := 00002000H;
000005A4  2    (* Set up adder value to 0 *)
000005A4  2    FAST_SQR.ADDER_VAL := 0;
000005AC  2    (* Set up initial AME masks/values to don't care *)
000005AC  2    FAST_SQR.LO_RG_MASK := 0;
000005B4  2    FAST_SQR.LO_RG_VAL := 0FFFFFFFFH;
000005C0  2    FAST_SQR.HI_RG_MASK := 0;
000005C8  2    FAST_SQR.HI_RG_VAL := 0FFFFFFFFH;
000005D4  2    FAST_SQR.LO_EQ_MASK := 0;
000005DC  2    FAST_SQR.LO_EQ_VAL := 0FFFFFFFFH;
000005E8  2    FAST_SQR.HI_EQ_MASK := 0;
000005F0  2    FAST_SQR.HI_EQ_VAL := 0FFFFFFFFH;
000005FC  2    CUR_MASK := 0002H;
00000604  2    FOR I := EQ_LO_RANGE TO SEQ_STOP DO
00000608  2      WITH FAST_SQR.FSR_INPUTS [ I ] DO
00000622  2        BEGIN (* Set up possible inputs *)
00000622  2          CONDITION := OFF;
00000626  2          TRUE_POLARITY :=  LOW;
00000630  2          MASK := CUR_MASK;
0000063A  2          CUR_MASK := SHIFT ( CUR_MASK, 1 )
00000644  2        END; (* Set up possible inputs *)
00000654  2    (* Some output polarities are high:  correct those *)
00000654  2    FAST_SQR.FSR_INPUTS [ LE_HI_RANGE ].TRUE_POLARITY := HIGH;
00000664  2    FAST_SQR.FSR_INPUTS [ GE_LO_RANGE ].TRUE_POLARITY := HIGH;
00000674  2    FAST_SQR.FSR_INPUTS [ SEQ_STOP ].TRUE_POLARITY := HIGH;
00000684  2    CUR_MASK := 0001H;
0000068C  2    FOR J := STORE_FSR TO FSRY DO
00000690  2      BEGIN (* Set up output masks *)
00000690  2        FAST_SQR.OUTPUT_MASKS [ J ] := CUR_MASK;
000006A6  2        FAST_SQR.OUTPUT_POLARS [ J ] := HIGH;
000006B8  2        CUR_MASK := SHIFT ( CUR_MASK, 1 )
000006C2  2      END; (* Set up output masks *)
000006D2  2    (* Some output polarities are low:  correct those *)
000006D2  2    FAST_SQR.OUTPUT_POLARS [ STORE_FSR ] := LOW;
000006DE  2    (* Set up state stuff *)
000006DE  2    FAST_SQR.STATE_MACH_PTR := NIL
000006E6  2  END; (* Procedure FAST_INIT *)
00000000  1
00000000  1
00000000  1
00000000  1
00000000  1
00000000  1  (*
00000000  1                        *********************
00000000  1                        ***** FUNC_INIT *****
00000000  1                        *********************
```

```
00000000 1                                                                    *)
00000000 1  PROCEDURE FUNC_INIT ( VAR FUNC_GEN_ARRAY:  F_G_ARRAY_TYPE );
00000000 2  (*
00000000 2    Procedure FUNC_INIT to initialize the function generator data
00000000 2    structure.  Procedure sets up the load address, legal high level
00000000 2    resource set, control values, output bit patterns and bit masks
00000000 2    for the function generators.
00000000 2
00000000 2    Input:  1) FUNC_GEN_ARRAY, the function generator data structure
00000000 2               describing the function generators
00000000 2    Output:  1) FUNC_GEN_ARRAY, the initialized function generator data
00000000 2                structure
00000000 2                                                                    *)
00000000 2  VAR
00000000 2
00000000 2    I:  FUNC_GEN_TYPES; (* FOR loop index *)
00000001 2
00000001 2    J:  OUTPUT_FUNCTIONS; (* FOR loop index *)
00000002 2
00000002 2    CUR_MASK:  L_INT; (* Currrent resource mask *)
000006EE 2
000006EE 2  BEGIN (* Procedure FUNC_INIT *)
000006EE 2    (* Initialize part of X function generator record *)
000006EE 2    FUNC_GEN_ARRAY [ X ].LOAD_PTR := 402000H;
000006F8 2    FUNC_GEN_ARRAY [ X ].LEGAL_HL_SET := HIGH_LEVEL_SET [ 4,5,6,7,8,9 ];
00000702 2    FUNC_GEN_ARRAY [ X ].OFF_VALUE := 000003BEH;
0000070E 2    FUNC_GEN_ARRAY [ X ].RAM_0_ADRS_MASK := 00001000H;
0000071A 2    FUNC_GEN_ARRAY [ X ].OUTPUT_MASKS [ O_FB_0 ] := 10000000H;
0000072A 2    FUNC_GEN_ARRAY [ X ].OUTPUT_MASKS [ O_FB_1 ] := 20000000H;
0000073A 2    FUNC_GEN_ARRAY [ X ].OUTPUT_MASKS [ O_FB_2 ] := 40000000H;
0000074A 2    FUNC_GEN_ARRAY [ X ].OUTPUT_MASKS [ O_FB_3 ] := 80000000H;
0000075A 2    (* Initialize part of Y function generator record *)
0000075A 2    FUNC_GEN_ARRAY [ Y ].LOAD_PTR := 400000H;
00000766 2    FUNC_GEN_ARRAY [ Y ].LEGAL_HL_SET := HIGH_LEVEL_SET [ 0,1,2,3,8,9 ];
00000774 2    FUNC_GEN_ARRAY [ Y ].OFF_VALUE := 000007BEH;
00000784 2    FUNC_GEN_ARRAY [ Y ].RAM_0_ADRS_MASK := 00000800H;
00000794 2    FUNC_GEN_ARRAY [ Y ].OUTPUT_MASKS [ O_FB_0 ] := 1000H;
000007A8 2    FUNC_GEN_ARRAY [ Y ].OUTPUT_MASKS [ O_FB_1 ] := 2000H;
000007BC 2    FUNC_GEN_ARRAY [ Y ].OUTPUT_MASKS [ O_FB_2 ] := 4000H;
000007D0 2    FUNC_GEN_ARRAY [ Y ].OUTPUT_MASKS [ O_FB_3 ] := 8000H;
000007E4 2    FOR I := X TO Y DO
000007E8 2      WITH FUNC_GEN_ARRAY [ I ] DO
000007FE 2        BEGIN (* Initialize portions of the function generator records *)
000007FE 2          CUR_MASK := 0001H;
00000806 2          FOR J := START_QUAL TO SEQUENCE_STOP DO
0000080A 2            BEGIN (* Set up output masks *)
0000080A 2              OUTPUT_MASKS [ J ] := CUR_MASK;
00000820 2              OUTPUT_POLARS [ J ] := LOW;
00000834 2              CUR_MASK := SHIFT ( CUR_MASK, 1 )
0000083E 2            END; (* Set up output masks *)
0000084E 2          (* Some output polarities are high:  correct those *)
0000084E 2          OUTPUT_POLARS [ START_QUAL ] := HIGH;
00000858 2          OUTPUT_POLARS [ STOP ] := HIGH;
00000864 2          OUTPUT_POLARS [ O_FB_0 ] := HIGH;
00000870 2          OUTPUT_POLARS [ O_FB_1 ] := HIGH;
0000087C 2          OUTPUT_POLARS [ O_FB_2 ] := HIGH;
00000888 2          OUTPUT_POLARS [ O_FB_3 ] := HIGH;
00000894 2          (* Set up state stuff *)
00000894 2          NUM_WINDOW_BITS := 0;
0000089C 2          NUM_STATE_BITS := 0;
000008A4 2          STATE_MACH_PTR := NIL
000008AC 2        END (* Initialize portions of the function generator records *)
000008BE 2  END; (* Procedure FUNC_INIT *)
00000000 1
00000000 1
00000000 1
00000000 1
00000000 1
00000000 1  (*
00000000 1                         ********************
00000000 1                         ***** MISC_INIT *****
00000000 1                         ********************
00000000 1                                                                    *)
00000000 1  PROCEDURE MISC_INIT ( VAR MISC_ARRAY:  MISC_ARRAY_TYPE );
```

```
00000000 2 (*
00000000 2   Procedure MISC_INIT to initialize the misc. signal data structure.
00000000 2   Procedure sets up the bit masks and initial conditions of all the
00000000 2   miscellaneous signals in the MISC_ARRAY.
00000000 2
00000000 2   Input:  1) MISC_ARRAY, the misc. signal data structure describing
00000000 2              the usage of the misc. signals
00000000 2   Output:  1) MISC_ARRAY, the initialized misc. signal array
00000000 2                                                                    *)
00000000 2 VAR
00000000 2
00000000 2   I:  MISC_DRIVERS; (* FOR loop index *)
00000001 2
00000001 2   CUR_MASK:  L_INT; (* Currrent resource mask *)
000008C6 2
000008C6 2 BEGIN (* Procedure MISC_INIT *)
000008C6 2   CUR_MASK := 0020H;
000008CE 2   FOR I := OCCUR_TERM TO I_FB_3 DO
000008D2 2     WITH MISC_ARRAY [ I ] DO
000008E8 2       BEGIN (* Initialize portions of the misc. signal record *)
000008E8 2         CONDITION := OFF;
000008EC 2         TRUE_POLARITY := HIGH;
000008F4 2         MASK := CUR_MASK;
000008FE 2         CUR_MASK := SHIFT ( CUR_MASK, 1 )
00000908 2       END; (* Initialize portions of the misc. signal record *)
00000918 2   (* OCCUR_TERM and EXT_STIM masks were set up wrong:  correct them *)
00000918 2   MISC_ARRAY [ OCCUR_TERM ].MASK := 0002H;
00000924 2   MISC_ARRAY [ EXT_STIM ].MASK := 0001H
00000934 2 END; (* Procedure MISC_INIT *)
00000000 1
00000000 1
00000000 1
00000000 1
00000000 1
00000000 1 (*
00000000 1                             ************************
00000000 1                             ***** FEAT_INIT *****
00000000 1                             ************************
00000000 1                                                                    *)
00000000 1 PROCEDURE FEAT_INIT ( VAR FEAT_ARRAY:  FEAT_ARRAY_TYPE );
00000000 2 (*
00000000 2   Procedure FEAT_INIT to initialize the feature array data structure.
00000000 2   Procedure sets up the bit masks and initial conditions of all the
00000000 2   feature signals in the FEAT_ARRAY.
00000000 2
00000000 2   Input:  1) FEAT_ARRAY, the array describing what features are to
00000000 2              be used
00000000 2   Output:  1) FEAT_ARRAY, the initialized feature array
00000000 2                                                                    *)
00000000 2 VAR
00000000 2
00000000 2   I:  FEATURE_TYPES; (* FOR loop index *)
00000001 2
00000001 2   CUR_MASK:  L_INT; (* Currrent resource mask *)
0000093C 2
0000093C 2 BEGIN (* Procedure FEAT_INIT *)
0000093C 2   CUR_MASK := 8000H; (* Initialize current bit mask *)
00000944 2   FOR I := DRIVE_GMC TO FPC_TIME_MODE DO
00000948 2     WITH FEAT_ARRAY [ I ] DO
0000095C 2       BEGIN (* Initialize portions of the feature records *)
0000095C 2         CONTROLLER := CONTROL_1;
0000095E 2         STATUS.CONDITION := OFF;
00000966 2         STATUS.TRUE_POLARITY := HIGH;
00000970 2         STATUS.MASK := CUR_MASK;
0000097A 2         CUR_MASK := SHIFT ( CUR_MASK, -1 )
00000984 2       END; (* Initialize portions of the feature records *)
00000994 2
00000994 2   (* STOP_MEM_FULL was set up incorrectly:  special case its polarity *)
00000994 2   FEAT_ARRAY [ STOP_MEM_FULL ].STATUS.TRUE_POLARITY := LOW;
000009A2 2
000009A2 2   (* All features in other words must now be corrected also *)
000009A2 2   FEAT_ARRAY [ BREAK_ON_SEARCH ].CONTROLLER := CONTROL_2;
000009AC 2   FEAT_ARRAY [ BREAK_ON_SEARCH ].STATUS.MASK := 0200H;
000009BC 2
000009BC 2   FEAT_ARRAY [ TIME_TIME_MODE ].CONTROLLER := CONTROL_2;
```

```
000009C6  2    FEAT_ARRAY [ TIME_TIME_MODE ].STATUS.MASK := 0004H;
000009D6  2
000009D6  2    FEAT_ARRAY [ BREAK_ON_STOP ].CONTROLLER := CONTROL_2;
000009E0  2    FEAT_ARRAY [ BREAK_ON_STOP ].STATUS.MASK := 0002H;
000009F0  2
000009F0  2    FEAT_ARRAY [ FPC_TIME_MODE ].CONTROLLER := CONTROL_BYTE;
000009FA  2    FEAT_ARRAY [ FPC_TIME_MODE ].STATUS.MASK := 0002H
00000A0A  2
00000A0A  2  END; (* Procedure FEAT_INIT *)
00000000  1
00000000  1
00000000  1
00000000  1
00000000  1
00000000  1  (*
00000000  1                            ************************
00000000  1                            ***** ASSIGN_SPEC *****
00000000  1                            ************************
00000000  1                                                                                    *)
00000000  1  $GLOBPROC ONS
00000000  1  FUNCTION ASSIGN_SPEC ( PRI:  S_INT ):  TRACE_SPEC_PTR;
00000004  2  (*
00000004  2    Function ASSIGN_SPEC to create a new trace specification node for
00000004  2    the Dynamic Controller.  Function NEWs the node, then initializes
00000004  2    all necessary fields.  This process includes the initialization of
00000004  2    the hardware specification data structure, which contains bit
00000004  2    patterns, logic polarities, etc for harcware signals.  Therefore, it
00000004  2    is imperative that this initialization is accomplised before a
00000004  2    hardware spec is passed to anyone ( ie the loader )!
00000004  2
00000004  2    ASSIGN_SPEC uses the following routines:  LOW_INIT, HIGH_INIT,
00000004  2    FAST_INIT, FUNC_INIT, MISC_INIT, and FEAT_INIT.
00000004  2
00000004  2    Input:  1) PRI, the priority of the trace specification
00000004  2    Output:  1) a pointer to the new, initialized trace specification
00000004  2                node, in function name
00000004  2                                                                                    *)
00000004  2  VAR
00000004  2
00000004  2    SPEC:  TRACE_SPEC_PTR; (* Pointer to new trace specification node *)
00000A12  2
00000A12  2  BEGIN (* Function ASSIGN_SPEC *)
00000A12  2    NEW ( SPEC ); (* Create new specification node *)
00000A24  2    SPEC^.PRIORITY := PRI;
00000A2C  2    SPEC^.STATUS := READY;
00000A34  2    SPEC^.UN_REQUEST := UN_NOTHING;
00000A3C  2    SPEC^.NEXT_SPEC := NIL;
00000A44  2    (* Initialize the low level resource data structure *)
00000A44  2    LOW_INIT ( SPEC^.HW_SPEC.LOW_LEVELS );
00000A52  2    (* Initialize the high level resource data structure *)
00000A52  2    HIGH_INIT ( SPEC^.HW_SPEC.HIGH_LEVELS );
00000A60  2    (* Initialize the fast sequencer data structure *)
00000A60  2    FAST_INIT ( SPEC^.HW_SPEC.FAST_SEQUENCER );
00000A6E  2    (* Initialize the function generators *)
00000A6E  2    FUNC_INIT ( SPEC^.HW_SPEC.FUNC_GENERATORS );
00000A7C  2    (* Initialize the misc. signal data structure *)
00000A7C  2    MISC_INIT ( SPEC^.HW_SPEC.MISC_SIGNALS );
00000A8A  2    (* And finally, initialize the feature data structure *)
00000A8A  2    FEAT_INIT ( SPEC^.HW_SPEC.FEATURES );
00000A98  2    (* And really finally, initialize the counters *)
00000A98  2    SPEC^.HW_SPEC.MICRO_COUNTERS := NIL;
00000AA0  2    SPEC^.HW_SPEC.TIME_COUNTER := 2;
00000AAC  2    SPEC^.HW_SPEC.OCCUR_COUNTER := 2;
00000AB6  2    SPEC^.HW_SPEC.START_MAC := 1;
00000AC0  2    (* And really, really finally, set all the dirty flags *)
00000AC0  2    SPEC^.HW_SPEC.RAM_DIRTY := TRUE;
00000ACA  2    SPEC^.HW_SPEC.RSRC_DIRTY := TRUE;
00000AD4  2    ASSIGN_SPEC := SPEC (* Assign final function value *)
00000ADA  2  END; (* Function ASSIGN_SPEC *)
00000000  1  $GLOBPROC OFF$
00000000  1

508: Warning: field or entry alignment; record or array comparisons may not work

End of compilation, number of errors=    0
```

```
00000000 1 "68000" PREPROCESS
00000000 1 $EXTENSIONS ONS
00000000 1 $TITLE "Soda Dynamic Controller Help Routines"
00000000 1 PROGRAM HELPERS;
00000000 1 (*
00000000 1 ****************************** HELPERS ********************************
00000000 1   HELPERS is a module which defies description.  It is a conglomeration
00000000 1   of routines for "helping" build the trace specifications of the
00000000 1   Dynamic Controller.  Most of the routines are extremely limited in
00000000 1   scope, ie they are for a specific purpose, but are used in many of
00000000 1   the translators.  HELPERS is processor independent.
00000000 1   Author:  Kip Fulghum
00000000 1   Date:  9-29-83  Revised:  9-13-84
00000000 1 ***********************************************************************
00000000 1
00000000 1   HELPERS contains the following routines:
00000000 1   -Global procedure START_SPEC allocates and prepares a trace spec
00000000 1    for use.
00000000 1   -Global procedure START_GEN prepares a function generator for use.
00000000 1   -Global procedure SEQUENCE sequences a new state after the given
00000000 1    state.
00000000 1   -Global procedure START_CONTROL turns the START enabled functions on
00000000 1    or off.
00000000 1   -Global procedure CLOSE_IO_NODE closes out a function generator I/O
00000000 1    node.
00000000 1   -Global procedure CLOSE_OR_NODE closes out a function generator I/O
00000000 1    node consisting of a number of ORed terms.
00000000 1   -Global procededure CLOSE_IO_LIST closes out a function generator I/O
00000000 1    list with a don't care I/O node.
00000000 1
00000000 1   In addition, the following external routines are used:  ASSIGN_SPEC,
00000000 1   ASSIGN_STATE, ASSIGN_IO, ADD_OPERATOR, ADD_OUTPUTS, and SET_FEATURE.
00000000 1                                                                      *)
00000000 1 (*
00000000 1                            *************************
00000000 1                            ***** Include Files *****
00000000 1                            *************************
00000000 1                                                                      *)
00000000 1
00000000 1 #INCLUDE ER_CONST:SS_DYN
00000000 1
00000000 1 #INCLUDE COM_TYPES:SS_DYN
00000000 1
00000000 1 #INCLUDE LD_TYPES:SS_DYN
00000000 1
00000000 1
00000000 1
00000000 1
00000000 1
00000000 1 (*
00000000 1                             ***********************
00000000 1                             ***** ASSIGN_SPEC *****
00000000 1                             ***********************
00000000 1                                                                      *)
00000000 1 FUNCTION ASSIGN_SPEC ( PRI:  S_INT ):  TRACE_SPEC_PTR; EXTERNAL;
00000000 1 (*
00000000 1   Function ASSIGN_SPEC to create a new trace specification node for
00000000 1   the Dynamic Controller.  Provided as a Pascal external.
00000000 1                                                                      *)
00000000 1
00000000 1
00000000 1
00000000 1
00000000 1
00000000 1 (*
00000000 1                            ************************
00000000 1                            ***** ASSIGN_STATE *****
00000000 1                            ************************
00000000 1                                                                      *)
00000000 1 FUNCTION ASSIGN_STATE ( CUR_STATE:  STATE_TYPE ):  STATE_REC_PTR;
00000000 2                          EXTERNAL;
00000000 1 (*
00000000 1   Function ASSIGN_STATE to create a new state node for the function
00000000 1   generators data structure.  Provided as a Pascal external.
00000000 1                                                                      *)
```

```
00000000 1
00000000 1
00000000 1
00000000 1
00000000 1
00000000 1  (*
00000000 1                        **********************
00000000 1                        ***** ASSIGN_IO *****
00000000 1                        **********************
00000000 1                                                                  *)
00000000 1  FUNCTION ASSIGN_IO ( NEXT_STATE:  STATE_TYPE ):  I_O_REC_PTR;
00000000 2                      EXTERNAL;
00000000 1  (*
00000000 1    Function ASSIGN_IO to create a new I/O node for the function
00000000 1    generators data structure.  Provided as a Pascal external.
00000000 1                                                                  *)
00000000 1
00000000 1
00000000 1
00000000 1
00000000 1
00000000 -1 (*
00000000 1                        *************************
00000000 1                        ***** ADD_OPERATOR *****
00000000 1                        *************************
00000000 1                                                                  *)
00000000 1  PROCEDURE ADD_OPERATOR ( INPUT:  ENTRY_TYPE; VAR IO:  I_O_REC;
00000000 2                           VAR CODE:  S_INT ); EXTERNAL;
00000000 1  (*
00000000 1    Procedure ADD_OPERATOR to "push" an operator onto a function generator
00000000 1    input function description.  Provided as a Pascal external.
00000000 1                                                                  *)
00000000 1
00000000 1
00000000 1
00000000 1
00000000 1
00000000 1  (*
00000000 1                        ************************
00000000 1                        ***** ADD_OUTPUTS *****
00000000 1                        ************************
00000000 1                                                                  *)
00000000 1  PROCEDURE ADD_OUTPUTS ( OUTPUT_SET:  OUT_SET_TYPE; VAR IO:  I_O_REC );
00000000 2                          EXTERNAL;
00000000 1  (*
00000000 1    Procedure ADD_OUTPUTS to add a set of output signals to the given
00000000 1    function generator I/O node's output function description.  Provided
00000000 1    as a Pascal external.
00000000 1                                                                  *)
00000000 1
00000000 1
00000000 1
00000000 1
00000000 1
00000000 1  (*
00000000 1                        ************************
00000000 1                        ***** SET_FEATURE *****
00000000 1                        ************************
00000000 1                                                                  *)
00000000 1  PROCEDURE SET_FEATURE ( ON_OFF:  CONDITION_TYPE, VAR FEAT_SIG:
00000000 2                          FEATURE_REC ); EXTERNAL;
00000000 1  (*
00000000 1    Procedure SET_FEATURE to turn on/off a feature signal.  Provided as
00000000 1    a Pascal external.
00000000 1                                                                  *)
00000000 1
00000000 1
00000000 1
00000000 1
00000000 1
00000000 1  (*
00000000 1                        ***********************
00000000 1                        ***** START_SPEC *****
00000000 1                        ***********************
```

```
00000000 1                                                                    *)
00000000 1  $GLOBPROC ONS
00000000 1  PROCEDURE START_SPEC ( PRI:  S_INT; TIME, BREAK:  BOOLEAN; VAR SPEC_PTR:
00000000 2                        TRACE_SPEC_PTR );
00000004 2  (*
00000004 2   Procedure START_SPEC to allocate and prepare a trace spec for use.
00000004 2   Procedure first allocates a spec, then sets a few common features
00000004 2   based on the given flags.
00000004 2
00000004 2   START_SPEC uses the following routines:  ASSIGN_SPEC and SET_FEATURE.
00000004 2
00000004 2   Input:  1) PRI, the priority of the trace specification
00000004 2           2) TIME, a flag indicating if we are counting time
00000004 2              ( TRUE ) or states ( FALSE )
00000004 2           3) BREAK, a flag indicating if break on stop is to be set on
00000004 2              ( TRUE ) or not ( FALSE )
00000004 2   Output:  1) SPEC_PTR, a pointer to the allocated and initialized
00000004 2               trace specification
00000004 2                                                                    *)
00000004 2  BEGIN (* Procedure START_SPEC *)
00000004 2   (* Make a spec *)
00000004 2   SPEC_PTR := ASSIGN_SPEC ( PRI );
00000014 2   (* Always stop on memory full *)
00000014 2   SET_FEATURE ( ON, SPEC_PTR^.HW_SPEC.FEATURES [ STOP_MEM_FULL ] );
00000026 2   (* See if we are counting time or states *)
00000026 2   IF TIME = TRUE
00000032 2     THEN (* We are counting time *)
00000032 2       SET_FEATURE ( ON, SPEC_PTR^.HW_SPEC.FEATURES [ FPC_TIME_MODE ] );
00000042 2   IF BREAK = TRUE
00000054 2     THEN (* We want to break at the end of the measurement *)
00000054 2       SET_FEATURE ( ON, SPEC_PTR^.HW_SPEC.FEATURES [ BREAK_ON_STOP ] )
0000006A 2  END; (* Procedure START_SPEC *)
00000000 1  $GLOBPROC OFFS
00000000 1
00000000 1
00000000 1
00000000 1
00000000 1
00000000 1  (*
00000000 1                          *********************
00000000 1                          ***** START_GEN *****
00000000 1                          *********************
00000000 1                                                                    *)
00000000 1  $GLOBPROC ONS
00000000 1  PROCEDURE START_GEN ( VAR GENERATOR:  FUNC_RESOURCE; START_STATE,
00000000 2                        NEXT_STATE:  S_INT; VAR STATE_PTR:  STATE_REC_PTR;
00000000 2                        VAR IO_PTR:  I_O_REC_PTR; VAR HIGH_SET:
00000000 2                        HIGH_LEVEL_SET );
00000072 2  (*
00000072 2   Procedure START_GEN to prepare a function generator for use.
00000072 2   Procedure sets up the initial state and I/O nodes of the given
00000072 2   generator, then returns them, plus the set of legal high level
00000072 2   resources for this generator, to the caller.
00000072 2
00000072 2   START_GEN uses the following routines:  ASSIGN_STATE and ASSIGN_IO.
00000072 2
00000072 2   Input:  1) GENERATOR, the function generator to be fired up
00000072 2           2) START_STATE, the initial state of the state machine
00000072 2           3) NEXT_STATE, the next state for the first I/O node
00000072 2   Output:  1) STATE_PTR, a pointer to the initial state node
00000072 2            2) IO_PTR, a pointer to the initial I/O node
00000072 2            3) HIGH_SET, the set of legal high level resources for the
00000072 2               given generator
00000072 2                                                                    *)
00000072 2  BEGIN (* Procedure START_GEN *)
00000072 2   STATE_PTR := ASSIGN_STATE ( START_STATE );
00000082 2   IO_PTR := ASSIGN_IO ( NEXT_STATE );
00000092 2   GENERATOR.STATE_MACH_PTR := STATE_PTR;
0000009E 2   GENERATOR.STATE_MACH_PTR^.I_O_PTR := IO_PTR;
000000AE 2   HIGH_SET := GENERATOR.LEGAL_HL_SET
000000BA 2  END; (* Procedure START_GEN *)
00000000 1  $GLOBPROC OFFS
00000000 1
00000000 1
```

```
00000000  1
00000000  1
00000000  1
00000000  1  (*
00000000  1                              ********************
00000000  1                              ***** SEQUENCE *****
00000000  1                              ********************
00000000  1                                                                  *)
00000000  1  $GLOBPROC ON
00000000  1  PROCEDURE SEQUENCE ( VAR GENERATOR:  FUNC_RESOURCE; VAR STATE_PTR:
00000000  2                      STATE_REC_PTR; VAR IO_PTR:  I_O_REC_PTR; VAR
00000000  2                      HIGH_SET:  HIGH_LEVEL_SET; VAR SEQ_CODE:  S_INT );
000000C2  2  (*
000000C2  2    Procedure SEQUENCE to sequence a new state after the given state.
000000C2  2    If the new state will be the first in the sequence, the given
000000C2  2    generator is fired up.  If not, the given state's first I/O node is
000000C2  2    modified to indicate a state transition.  In either case, a new state
000000C2  2    and initial I/O node are created under the assumption that the new
000000C2  2    state is the last one.  Both new nodes are linked in appropriately.
000000C2  2    If the newly created state overflowed the sequence, an error is
000000C2  2    returned.
000000C2  2
000000C2  2    Note:  this routine is meant for setting up enable/disable sequences,
000000C2  2           NOT measurement sequences!
000000C2  2
000000C2  2    SEQUENCE uses the following routines:  START_GEN, ASSIGN_STATE,
000000C2  2    and ASSIGN_IO.
000000C2  2
000000C2  2    Input:  1) GENERATOR, the function generator in which this state goes
000000C2  2            2) STATE_PTR, a pointer to the state after which the new state
000000C2  2               is to be added.  If NIL, the given generator is fired up
000000C2  2               and the created state will be first in the list.
000000C2  2    Output:  1) STATE_PTR, a pointer to the new state
000000C2  2             2) IO_PTR, a pointer to the new initial I/O node for the
000000C2  2                above state
000000C2  2             3) HIGH_SET, the set of legal high level resources for the
000000C2  2                given generator
000000C2  2             4) SEQ_CODE, a code specifying what happened:
000000C2  2                 -7 indicates out of sequence states
000000C2  2                  0 indicates no error:  operation completed
000000C2  2                                                                  *)
000000C2  2  BEGIN (* Procedure SEQUENCE *)
000000C2  2    SEQ_CODE := NO_ERROR;
000000C8  2
000000C8  2    (* Build the state *)
000000C8  2
000000C8  2    IF STATE_PTR = NIL
000000D2  2      THEN (* First state in list *)
000000D2  2        (* Start in state 0 and assume no following states *)
000000D2  2        START_GEN ( GENERATOR, 0, 0, STATE_PTR, IO_PTR, HIGH_SET )
000000FC  2      ELSE (* There is a previous state *)
000000FC  2        BEGIN (* Create new sequence state *)
000000FC  2          IF STATE_PTR^.I_O_PTR <> NIL
0000010A  2            THEN (* Change 1st I/O node of prev. state to goto next
0000010A  2                    state *)
0000010A  2              STATE_PTR^.I_O_PTR^.NEXT_STATE := STATE_PTR^.CUR_STATE + 1;
00000124  2          (* Create new state *)
00000124  2          STATE_PTR^.NEXT_STATE_PTR := ASSIGN_STATE ( STATE_PTR^.CUR_STATE
00000124  2                                                      + 1 );
00000140  2          STATE_PTR := STATE_PTR^.NEXT_STATE_PTR;
00000146  2          (* Assume no following states *)
00000146  2          STATE_PTR^.I_O_PTR := ASSIGN_IO ( STATE_PTR^.CUR_STATE );
0000016A  2          IO_PTR := STATE_PTR^.I_O_PTR;
00000178  2          HIGH_SET := GENERATOR.LEGAL_HL_SET
00000184  2        END; (* Create new sequence state *)
00000184  2
00000184  2    (* Check for overflow *)
00000184  2
00000184  2    IF STATE_PTR^.CUR_STATE > MAX_SEQ_STATE
00000196  2      THEN (* Too many sequence states *)
00000196  2        SEQ_CODE := OUT_OF_STATES
0000019E  2  END; (* Procedure SEQUENCE *)
```

```
00000000 1 $GLOBPROC OFF$
00000000 1
00000000 1
00000000 1
00000000 1
00000000 1
00000000 1 (*
00000000 1                          **************************
00000000 1                          ***** START_CONTROL *****
00000000 1                          **************************
00000000 1                                                                  *)
00000000 1 $GLOBPROC ON$
00000000 1 PROCEDURE START_CONTROL ( ON_OFF:  CONDITION_TYPE; VAR FEATS:
00000000 2                             FEAT_ARRAY_TYPE );
00000000 2 (*
00000000 2   Procedure START_CONTROL to turn the START enabled functions on
00000000 2   or off.  Procedure loops through all START enable signals, turning
00000000 2   them all on or off, depending on the input parameter.
00000000 2
00000000 2   START_CONTROL uses the following routine:  SET_FEATURE.
00000000 2
00000000 2   Input:  1) ON_OFF, either ON or OFF, depending on whether you want
00000000 2              the start signals on or off
00000000 2           2) FEATS, the structure describing all the feature signals,
00000000 2              including all the START enable signals
00000000 2   Output:  1) FEATS, the updated feature structure with all START
00000000 2               enable signals on or off as requested
00000000 2                                                                  *)
00000000 2 VAR
00000000 2
00000000 2   I:  FEATURE_TYPES; (* FOR loop index *)
000001A6 2
000001A6 2 BEGIN (* Procedure START_CONTROL *)
000001A6 2   FOR I := START_ARM_SEQ TO START_ARM_TIMER DO
000001AC 2     SET_FEATURE ( ON_OFF, FEATS [ I ] )
000001D6 2 END;(* Procedure START_CONTROL *)
00000000 1 $GLOBPROC OFF$
00000000 1
00000000 1
00000000 1
00000000 1
00000000 1
00000000 1 (*
00000000 1                          **************************
00000000 1                          ***** CLOSE_IO_NODE *****
00000000 1                          **************************
00000000 1                                                                  *)
00000000 1 $GLOBPROC ON$
00000000 1 PROCEDURE CLOSE_IO_NODE ( FINAL_OUTS:  OUT_SET_TYPE; VAR IO:  I_O_REC;
00000000 2                             VAR CLOSE_CODE:  S_INT );
000001DE 2 (*
000001DE 2   Procedure CLOSE_IO_NODE to close out a function generator I/O node.
000001DE 2   Procedure ends the node's input function, then adds the given output
000001DE 2   set to the node.
000001DE 2
000001DE 2   CLOSE_IO_NODE uses the following routines:  ADD_OPERATOR and
000001DE 2   ADD_OUTPUTS.
000001DE 2
000001DE 2   Input:  1) FINAL_OUTS, the set of outputs to be assigned to the I/O
000001DE 2              node
000001DE 2           2) IO, the I/O node itself
000001DE 2   Output:  1) IO, the modified I/O node
000001DE 2            2) CLOSE_CODE, a code specifying how the close went:
000001DE 2                 -6 indicates function overflow,
000001DE 2                  0 indicates no error:  operation completed
000001DE 2                                                                  *)
000001DE 2 BEGIN (* Procedure CLOSE_IO_NODE *)
000001DE 2   ADD_OPERATOR ( END_, IO, CLOSE_CODE );
000001F8 2   ADD_OUTPUTS ( FINAL_OUTS, IO )
00000208 2 END; (* Procedure CLOSE_IO_NODE *)
00000000 1 $GLOBPROC OFF$
00000000 1
00000000 1
00000000 1
00000000 1
```

```
00000000  1
00000000  1  (*
00000000  1                          ****************************
00000000  1                          ***** CLOSE_OR_NODE *****
00000000  1                          ****************************
00000000  1                                                                    *)
00000000  1  $GLOBPROC ONS
00000000  1  PROCEDURE CLOSE_OR_NODE ( FINAL_OUTS:  OUT_SET_TYPE; VAR IO:  I_O_REC;
00000000  2                           VAR CLOSE_CODE:  S_INT );
00000000  2  (*
00000000  2    Procedure CLOSE_OR_NODE to close out a function generator I/O node
00000000  2    consisting of a number of ORed terms.  Procedure uses the node's
00000000  2    input function index to determine the appropriate number of ORs to
00000000  2    add, then adds them.  The given output set is then added to the node
00000000  2    as well.
00000000  2
00000000  2    CLOSE_OR_NODE uses the following routines:  ADD_OPERATOR and
00000000  2    CLOSE_IO_NODE.
00000000  2
00000000  2    Input:  1) FINAL_OUTS, the set of outputs to be assigned to the I/O
00000000  2               node
00000000  2            2) IO, the I/O node itself
00000000  2    Output:  1) IO, the modified I/O node
00000000  2             2) CLOSE_CODE, a code specifying how the close went:
00000000  2                 -6 indicates function overflow,
00000000  2                  0 indicates no error:  operation completed
00000000  2                                                                    *)
00000000  2  VAR
00000000  2
00000000  2    MAX_INDEX:  S_INT; (* Number of operands-1 in input function array
00000002  2                          on entry to this procedure *)
00000002  2
00000002  2    J:  S_INT; (* FOR loop index *)
00000210  2
00000210  2  BEGIN (* Procedure CLOSE_OR_NODE *)
00000210  2    MAX_INDEX := IO.INPUT_INDEX; (* Remember # OR terms to start with *)
0000021A  2    (* Add all the necessary OR terms to the input function *)
0000021A  2    FOR J := 1 TO MAX_INDEX DO
00000230  2      ADD_OPERATOR ( OR_, IO, CLOSE_CODE );
0000025C  2    CLOSE_IO_NODE ( FINAL_OUTS, IO, CLOSE_CODE )
00000276  2  END; (* Procedure CLOSE_OR_NODE *)
00000000  1  $GLOBPROC OFFS
00000000  1
00000000  1
00000000  1
00000000  1
00000000  1
00000000  1  (*
00000000  1                          ****************************
00000000  1                          ***** CLOSE_IO_LIST *****
00000000  1                          ****************************
00000000  1                                                                    *)
00000000  1  $GLOBPROC ONS
00000000  1  PROCEDURE CLOSE_IO_LIST ( DC_STATE:  S_INT; DC_OUTS:  OUT_SET_TYPE;
00000000  2                           VAR LAST_IO:  I_O_REC );
0000027E  2  (*
0000027E  2    Procedure CLOSE_IO_LIST to close out a function generator I/O list
0000027E  2    with a don't care I/O node.  Procedure creates the I/O node, then
0000027E  2    adds the given outputs to its output list.
0000027E  2
0000027E  2    CLOSE_IO_LIST uses the following routines:  ASSIGN_IO and ADD_OUTPUTS.
0000027E  2
0000027E  2    Input:  1) DC_STATE, the next state for the don't care I/O node
0000027E  2            2) DC_OUTS, the set of outputs to be put in the don't care
0000027E  2               I/O node
0000027E  2            3) LAST_IO, the last I/O node in the list so far
0000027E  2    Output:  1) LAST_IO, the modified I/O node pointing to the don't care
0000027E  2               node
0000027E  2                                                                    *)
0000027E  2
0000027E  2  BEGIN (* Procedure CLOSE_IO_LIST *)
0000027E  2    (* Create don't care I/O node *)
0000027E  2    LAST_IO.NEXT_I_O_PTR := ASSIGN_IO ( DC_STATE );
0000029A  2    ADD_OUTPUTS ( DC_OUTS, LAST_IO.NEXT_I_O_PTR^ )
```

```
000002AE  2  END; (* Procedure CLOSE_IO_LIST *)
00000000  1  $GLOBPROC OFF$
00000000  1  .

508: Warning: field or entry alignment; record or array comparisons may not work

End of compilation, number of errors=    0

"68000"
*
*  Tabs at 5, 15, 35
*
    GLOBAL SET_BITS, CLEAR_BITS, MASK_BITS, TEST_BITS, MATCH_BITS
    GLOBAL READ_MAC, GET_SEXTET, GET_MICRO_COUNT, ADD_64, SUB_64
*
****************************** ASM_UTLS ******************************
*  ASM_UTLS is the module containing all the assembly language support
*  routines necessary for the Dynamic and Static Controllers.  Routines
*  here are bit manipulators or closely linked to the hardware set.
*  ASM_UTLS is processor independent.
*  Author:  Kip Fulghum
*  Date:  10-5-82  Revised:  10-21-84
**********************************************************************
*
*  ASM_UTLS contains the following routines:
*  -Procedure SET_BITS sets the bits indicated in one word in another
*   word, ie "OR"s the first word with the second.
*  -Procedure CLEAR_BITS clears the bits indicated in one word in
*   another word, ie "NOT"s the first word, then "AND"s it with the
*   second.
*  -Function MASK_BITS masks off all zero bits indicated in one word
*   in another word, ie "AND"s the first word with the second and
*   returns the result.
*  -Function TEST_BITS sees if all of the bits indicated in one word
*   are set in another, ie "AND"s them together and checks if the
*   result is equal to the initial word.
*  -Function MATCH_BITS sees if two words are equal after both have
*   been masked with the given mask word, ie "AND"s both words with
*   the mask and checks if they equal each other.
*  -Function READ_MAC reads the current value of the memory address
*   counter on the memory board.
*  -Procedure GET_SEXTET retrieves the indicated hardware data sextet
*   consisting of PC, address, grey-code time/state count, emulation
*   data, emulation status, and hardware flags from the hardware.
*  -Procedure GET_MICRO_COUNT retrieves the indicated hardware
*   micro-count from the hardware.
*  -Procedure ADD_64 does a double add, ie adds two 64 bit quantities
*   to come up with a 64 bit quantity.
*  -Procedure SUB_64 does a double subtract, ie subtracts one 64 bit
*   quantity from another to come up with a 64 bit quantity.





*                         ********************
*                         ***** SET_BITS *****
*                         ********************
*
*  Procedure SET_BITS to set the bits indicated in BIT_WORD in
*  SET_WORD, ie "OR" BIT_WORD with SET_WORD.
*
*  Declaration:
*
*  PROCEDURE SET_BITS ( BIT_WORD:  L_INT; VAR SET_WORD:  L_INT );
*                      EXTERNAL;
*
*  Input:  1) BIT_WORD, the word containing all bits set which are
*             to be set in SET_WORD
*          2) SET_WORD, the word in which the bits are to be set
*  Output:  1) SET_WORD, the updated word with all bits in BIT_WORD
*              set
*
```

```
000000           SET_BITS
               * BEGIN  ( Procedure SET_BITS
000000 202F 0008     MOVE.L   8(A7),D0          ; Get word containing bits to set.
000004 206F 0004     MOVEA.L  4(A7),A0          ; Get address of word to set bits in.
000008 8190          OR.L     D0,(A0)           ; OR the bits in.
00000A 4E75          RTS                        ; Return to calling program.
               * END    ( Procedure SET_BITS





               *                       **********************
               *                       ***** CLEAR_BITS *****
               *                       **********************
               *
               * Procedure CLEAR_BITS to clear the bits indicated in BIT_WORD in
               * CLEAR_WORD, ie "NOT" BIT_WORD, then "AND" with CLEAR_WORD.
               *
               * Declaration:
               *
               * PROCEDURE CLEAR_BITS ( BIT_WORD:  L_INT; VAR CLEAR_WORD:  L_INT );
               *                              EXTERNAL;
               *
               * Input:  1) BIT_WORD, the word containing all bits set which are
               *               to be cleared in CLEAR_WORD
               *            2) CLEAR_WORD, the word in which the bits are to be cleared
               * Output:  1) CLEAR_WORD, the updated word with all bits in BIT_WORD
               *               cleared
               *
00000C           CLEAR_BITS
               * BEGIN  ( Procedure CLEAR_BITS
00000C 202F 0008     MOVE.L   8(A7),D0          ; Get word containing bits to clear.
000010 4680          NOT.L    D0                ; One's complement it.
000012 206F 0004     MOVEA.L  4(A7),A0          ; Get adrs of word to clear bits in.
000016 C190          AND.L    D0,(A0)           ; AND the bits away.
000018 4E75          RTS                        ; Return to calling program.
               * END    ( Procedure CLEAR_BITS





               *                       *********************
               *                       ***** MASK_BITS *****
               *                       *********************
               *
               * Function MASK_BITS to mask off all zero bits indicated in BIT_WORD
               * in MASK_WORD, ie "AND" BIT_WORD with MASK_WORD and return the result.
               *
               * Declaration:
               *
               * FUNCTION MASK_BITS ( BIT_WORD, MASK_WORD:  L_INT ):  L_INT;
               *                              EXTERNAL;
               *
               * Input:  1) BIT_WORD, the word containing the mask with zeros in
               *               the bits to be masked in MASK_WORD
               *            2) MASK_WORD, the word in which the bits are to be masked
               * Output:  1) the result of "AND"ing BIT_WORD with MASK_WORD, in
               *               function name ( register D7 )
               *
00001A           MASK_BITS
               * BEGIN  ( Function MASK_BITS
00001A 2E2F 0008     MOVE.L   8(A7),D7          ; Get word containing mask.
00001E CEAF 0004     AND.L    4(A7),D7          ; AND the bits away.
000022 4E75          RTS                        ; Return to calling program.
               * END    ( Function MASK_BITS





               *                       **********************
               *                       ***** TEST_BITS *****
               *                       **********************
```

```
              *
              *  Function TEST_BITS to see if all of the bits indicated in BIT_WORD
              *  are set in TEST_WORD, ie "AND" both words and see if the result is
              *  equal to BIT_WORD.
              *
              *  Declaration:
              *
              *  FUNCTION TEST_BITS ( BIT_WORD, TEST_WORD:  L_INT ):  BOOLEAN;
              *                         EXTERNAL;
              *
              *  Input:  1) BIT_WORD, the word containing all bits set which are
              *             to be tested for in TEST_WORD
              *          2) TEST_WORD, the word in which the bits are to be tested
              *  Output:  1) TRUE ( 1 ) if all of the bits in BIT_WORD ard set in
              *              TEST_WORD, FALSE ( 0 ) otherwise, in function name
              *              ( register D7 )
              *
000024        TEST_BITS
              *  BEGIN  < Function TEST_BITS
000024 1E3C 0000     MOVE.B    #0,D7              ; Assume false.
000028 202F 0008     MOVE.L    8(A7),D0
00002C C0AF 0004     AND.L     4(A7),D0           ; AND the suckers together.
000030 B0AF 0008     CMP.L     8(A7),D0
000034 6604          BNE.S     TEST_DONE          ; If they don't compare, return false.
              *
000036 1E3C 0001     MOVE.B    #1,D7              ; Bits set:  return true.
00003A        TEST_DONE
00003A 4E75          RTS                          ; Say goodbye.
              *  END    < Function TEST_BITS





              *                          ***********************
              *                          ***** MATCH_BITS *****
              *                          ***********************
              *
              *  Function MATCH_BITS to see if two words are equal after both have
              *  been masked with the given mask word, ie "AND" both words with
              *  BIT_MASK and check if they equal each other.
              *
              *  Note:  this routine deals with 16 bit words, not 32 bitters!
              *
              *  Declaration:
              *
              *  FUNCTION MATCH_BITS ( BIT_WORD1, BIT_WORD2, BIT_MASK:  S_INT ):
              *                          S_INT; EXTERNAL;
              *
              *  Input:  1) BIT_WORD1, the first word to apply the mask to
              *          2) BIT_WORD2, the second word to apply the mask to
              *          3) BIT_MASK, the mask word
              *  Output:  1) TRUE ( 1 ) if BIT_WORD1 "AND"ed with BIT_MASK equals
              *              BIT_WORD2 "AND"ed with BIT_MASK, FALSE ( 0 ) otherwise,
              *              in function name ( register D7 )
              *
00003C        MATCH_BITS
              *  BEGIN  < Function MATCH_BITS
00003C 1E3C 0000     MOVE.B    #0,D7              ; Assume false.
000040 302F 0008     MOVE.W    8(A7),D0
000044 C06F 0004     AND.W     4(A7),D0           ; AND first word with mask.
000048 322F 0006     MOVE.W    6(A7),D1
00004C C26F 0004     AND.W     4(A7),D1           ; AND second word with mask.
000050 B240          CMP.W     D0,D1
000052 6604          BNE.S     MATCH_DONE         ; If they don't compare, return false.
              *
000054 1E3C 0001     MOVE.B    #1,D7              ; Match:  return true.
000058        MATCH_DONE
000058 4E75          RTS                          ; Return to calling program.
              *  END    < Function MATCH_BITS
```

```
                                     ********************
                                     ***** READ_MAC *****
                                     ********************
               *
               *  Function READ_MAC to read the current value of the memory address
               *  counter on the memory board.  Function returns the 12 bit value in
               *  register D7, with all upper bits cleared.
               *
               *  Declaration:
               *
               *  FUNCTION READ_MAC:  S_INT; EXTERNAL;
               *
               *  Input:  none
               *  Output:  1) the current value of the memory address counter in lower
               *              12 bits of register D7 ( with upper 20 bits cleared )
               *
00005A         READ_MAC
               *  BEGIN  < Function READ_MAC
00005A 3E39 0081    MOVE.W   MAC,D7              ; Get the counter.
000060 0287         ANDI.L   #0FFFH,D7           ; Mask off upper 20 bits.
000066 4E75         RTS                          ; Return to calling program.
               *  END    < Function READ_MAC
               *
               *                    ***** Data Equates *****
               *
   <0081C000>  MAC EQU      81C000H              ; Memory address counter location.





               *                      ***********************
               *                      ***** GET_SEXTET *****
               *                      ***********************
               *
               *  Procedure GET_SEXTET to retrieve the indicated hardware data sextet.
               *  consisting of PC, address, grey-code time/state count, emulation data,
               *  emulation status, and hardware flags from the hardware.  The
               *  unloaded information is then packed into the given record, with
               *  all garbage bits masked off.
               *
               *  Special register usage:
               *       A0 contains the beginning address of the return structure ( see
               *          below )
               *       A1 is used as a scratch pad
               *       A2 is used as a scratch pad
               *       D0 contains the byte offset into acquisition memory
               *       D1 is used as a scratch pad
               *
               *  Note:  the hardware grey-code count associated with each sextet
               *         and each memory count is offset by 2 bytes in acquisition
               *         memory from where the other pieces of the sextet are found.
               *         This means that when the last acquisition state is referenced,
               *         its time tag is at location 0!
               *
               *  Declaration:
               *
               *  PROCEDURE GET_SEXTET ( M_COUNT:  S_INT; VAR SEXTET:
               *                         SEXTET_REC_TYPE ); EXTERNAL;
               *  Where:
               *
               *  SEXTET_REC_TYPE = RECORD
               *                    PC:  L_INT; (* PC value *)
               *                    ADRS:  L_INT; (* Address *)
               *                    COUNT:  DOUBLE_ARRAY; (* Time/state count *)
               *                    DATA:  S_INT; (* Emulation data *)
               *                    STATUS:  S_INT; (* Emulation status *)
               *                    FLAGS:  FLAG_SET  (* Stored HW flags *)
               *                  END; (* Of record *)
               *
               *  Input:  1) M_COUNT, a count into memory of what location to unload
               *  Output:  1) SEXTET, the updated output record containing the unloaded
               *              PC, address, grey-code count ( in word 0 of double
               *              array ), data, status, and hw flags
               *
```

```
000068              GET_SEXTET
                  * BEGIN  { Procedure GET_SEXTET
000068 4280           CLR.L    D0
00006A 302F 0008      MOVE.W   8[A7],D0             ; Get M_COUNT.
00006E E388           LSL.L    #1,D0                ; Change M_COUNT to byte adrs offset.
000070 206F 0004      MOVEA.L  4[A7],A0             ; Get address of SEXTET record.
                  *
                  *   SEXTET.DATA
                  *
000074 227C           MOVEA.L  #DATA_ADRS,A1        ; Get base address for data.
00007A 3171 0800      MOVE.W   0[A1,D0.L],16[A0]    ; Pull DATA out.
                  *
                  *   SEXTET.ADRS
                  *
000080 227C           MOVEA.L  #LO_EMUL_ADRS,A1     ; Get base address for lo emul adrs.
000086 3171 0800      MOVE.W   0[A1,D0.L],6[A0]     ; Pull lo ADRS out.
                  *
00008C 227C           MOVEA.L  #UP_EMUL_ADRS,A1     ; Get base address for up emul adrs.
000092 3171 0800      MOVE.W   0[A1,D0.L],4[A0]     ; Pull up ADRS out.
000098 0268 00FF      ANDI.W   #00FFH,4[A0]         ; Mask off upper byte.
                  *
                  *   SEXTET.STATUS
                  *
00009E 227C           MOVEA.L  #STATUS_ADRS,A1      ; Get base address for status.
0000A4 3231 0800      MOVE.W   0[A1,D0.L],D1        ; Pull STATUS out.
0000A8 E049           LSR.W    #8,D1                ; Shift and 0 upper byte.
0000AA 3141 0012      MOVE.W   D1,18[A0]
                  *
                  *   SEXTET.PC
                  *
0000AE 227C           MOVEA.L  #LO_PC_ADRS,A1       ; Get base address for lo pc.
0000B4 3171 0800      MOVE.W   0[A1,D0.L],2[A0]     ; Pull lo PC out.
                  *
0000BA 227C           MOVEA.L  #UP_PC_ADRS,A1       ; Get base address for up pc.
0000C0 30B1 0800      MOVE.W   0[A1,D0.L],[A0]      ; Pull up PC out.
0000C4 0250 00FF      ANDI.W   #00FFH,[A0]          ; Mask off upper byte.
                  *
                  *   SEXTET.FLAGS
                  *
0000C8 227C           MOVEA.L  #FLAG_ADRS,A1        ; Get base address for flags.
0000CE 3231 0800      MOVE.W   0[A1,D0.L],D1        ; Pull FLAGS out.
0000D2 E849           LSR.W    #4,D1
0000D4 0241 0F00      ANDI.W   #0F00H,D1            ; Mask off lower word.
0000D8 3141 0014      MOVE.W   D1,20[A0]
                  *
                  *   SEXTET.COUNT
                  *
0000DC 227C           MOVEA.L  #LO_COUNT_ADRS,A1    ; Get lower and upper count address.
0000E2 247C           MOVEA.L  #UP_COUNT_ADRS,A2
0000E8 0C80           CMPI.L   #8190,D0             ; See if this is last location...
0000EE 670C           BEQ.S    WRAP_TIME            ; and branch for memory wrap.
                  *
0000F0 3171 0802      MOVE.W   2[A1,D0.L],10[A0]    ; Pull lo COUNT out.
                  *
0000F6 3232 0802      MOVE.W   2[A2,D0.L],D1        ; Pull up COUNT out.
                  *
0000FA 6006           BRA.S    FINISH_COUNT
0000FC              WRAP_TIME
0000FC 3151 000A      MOVE.W   [A1],10[A0]          ; Pull lo COUNT out.
                  *
000100 3212           MOVE.W   [A2],D1              ; Pull up COUNT out.
000102              FINISH_COUNT
000102 E049           LSR.W    #8,D1
000104 0241 000F      ANDI.W   #000FH,D1            ; Mask off upper 3 nibbles.
000108 3141 0008      MOVE.W   D1,8[A0]
00010C 4E75           RTS                           ; Return to calling program.
                  * END    { Procedure GET_SEXTET
                  *
                  *                 ***** Data Equates *****
                  *
      <00810000>    DATA_ADRS      EQU 810000H      ; Address of data word.
      <00812000>    LO_EMUL_ADRS   EQU 812000H      ; Address of lower word of emul. adrs.
      <00814000>    UP_EMUL_ADRS   EQU 814000H      ; Address of upper byte of emul. adrs.
      <00814000>    STATUS_ADRS    EQU 814000H      ; Address of status byte.
      <00816000>    LO_PC_ADRS     EQU 816000H      ; Address of lower word of PC.
```

```
      <00810000>   UP_PC_ADRS    EQU 810000H          ; Address of upper byte of PC.
      <00818000>   FLAG_ADRS     EQU 810000H          ; Address of flag nibble.
      <0081A000>   LO_COUNT_ADRS EQU 81A000H          ; Address of lower word of count.
      <0081B000>   UP_COUNT_ADRS EQU 81B000H          ; Address of upper nibble of count.




                   *                     ****************************
                   *                     ***** GET_MICRO_COUNT *****
                   *                     ****************************
                   *
                   *  Procedure GET_MICRO_COUNT to retrieve the indicated hardware
                   *  micro-count from the hardware.  The unloaded count is then returned
                   *  with all garbage bits masked off.
                   *
                   *  Declaration:
                   *
                   *  PROCEDURE GET_MICRO_COUNT ( COUNTER:  S_INT; VAR COUNT:  S_INT );
                   *                              EXTERNAL;
                   *
                   *  Input:  1) COUNTER, the # of the counter to unload
                   *  Output:  1) COUNT, the unloaded 12 bit count ( with upper 4 bits
                   *              cleared )
                   *
00010E             GET_MICRO_COUNT
                   *  BEGIN  ( Procedure GET_MICRO_COUNT
00010E 33EF 0008      MOVE.W    8[A7],MICRO_NUMBER  ; Set counter number.
000116 3039 0022      MOVE.W    MICRO_DATA,D0       ; Get data.
00011C 0240 0FFF      ANDI.W    #0FFFH,D0           ; Mask off upper 4 bits.
000120 206F 0004      MOVEA.L   4[A7],A0            ; Get address of return parameter.
000124 3080           MOVE.W    D0,[A0]
000126 4E75           RTS                           ; Return to calling program.
                   *  END    ( Procedure GET_MICRO_COUNT
                   *
                   *                      ***** Data Equates *****
                   *
      <0022A000>   MICRO_DATA    EQU 22A000H          ; Address of data port.
      <0022C000>   MICRO_NUMBER  EQU 22C000H          ; Address of adrs port.





                   *                            ********************
                   *                            ***** ADD_64 *****
                   *                            ********************
                   *
                   *  Procedure ADD_64 to do a double add, ie add two 64 bit quantities
                   *  to come up with a 64 bit quantity.  Procedure simply adds the
                   *  lower 32 bits of each addend, then adds the upper 32 bits of each
                   *  operand with the extend bit.  No error checking is done to make sure
                   *  that the result does not overflow.
                   *
                   *  Declaration:
                   *
                   *  PROCEDURE ADD_64 ( VAR ADDEND_1, ADDEND_2, ANSWER:  DOUBLE_ARRAY );
                   *                     EXTERNAL;
                   *  Where:
                   *
                   *  DOUBLE_ARRAY = ARRAY [ 0..1 ] OF L_INT;
                   *
                   *  Input:  1) ADDEND_1, the first 64 bit quantity ( msw 1st in array )
                   *          2) ADDEND_2, the second 64 bit quantity ( msw 1st in array )
                   *  Output:  1) ANSWER, the 64 bit answer ( msw 1st in array )
                   *
000128             ADD_64
                   *  BEGIN ( Procedure ADD_64
000128 206F 000C      MOVEA.L   12[A7],A0           ; Get adrs of first addend.
00012C 226F 0008      MOVEA.L   8[A7],A1            ; Get adrs of second addend.
000130 2028 0004      MOVE.L    4[A0],D0            ; Get least significant word of
                   *                                ; first addend.
000134 2229 0004      MOVE.L    4[A1],D1            ; Get least significant word of
```

```
                 *                              ; second addend.
000138 2410         MOVE.L    (A0),D2           ; Get most significant word of
                 *                              ; first addend.
00013A 2611         MOVE.L    (A1),D3           ; Get most significant word of
                 *                              ; second addend.
00013C D081         ADD.L     D1,D0             ; Add least significant words.
00013E D583         ADDX.L    D3,D2             ; Add most significant words with
                 *                              ; extend.
000140 246F 0004    MOVE.L    4(A7),A2          ; Get adrs of return parameter.
000144 2540 0004    MOVE.L    D0,4(A2)          ; Return least significant word.
000148 2482         MOVE.L    D2,(A2)           ; Return most significant word.
00014A 4E75         RTS
                 *  END   ( Procedure ADD_64





                 *                     *******************
                 *                     ***** SUB_64 *****
                 *                     *******************
                 *
                 *  Procedure SUB_64 to do a double subtract, ie subtract one 64 bit
                 *  quantity from another to come up with a 64 bit quantity.  Procedure
                 *  simply subtacts the lower 32 bits of the subtrahend, then subtracts
                 *  the upper 32 bits with the extend bit.  No error checking is done
                 *  to make sure that the result does not underflow.
                 *
                 *  Declaration:
                 *
                 *  PROCEDURE SUB_64 ( VAR MINUEND, SUBTRAHEND, ANSWER:  DOUBLE_ARRAY );
                 *                     EXTERNAL;
                 *  Where:
                 *
                 *  DOUBLE_ARRAY = ARRAY [ 0..1 ] OF L_INT;
                 *
                 *  Input:  1) MINUEND, the first 64 bit quantity ( msw 1st in array )
                 *          2) SUBTRAHEND, the second 64 bit quantity ( msw 1st in
                 *             array ) to be subtracted from the minuend
                 *  Output:  1) ANSWER, the 64 bit answer ( msw 1st in array )
                 *
00014C           SUB_64
                 *  BEGIN ( Procedure SUB_64
00014C 206F 000C    MOVEA.L   12(A7),A0         ; Get adrs of minuend.
000150 226F 0008    MOVEA.L   8(A7),A1          ; Get adrs of subtrahend.
000154 2028 0004    MOVE.L    4(A0),D0          ; Get least significant word of
                 *                              ; minuend.
000158 2229 0004    MOVE.L    4(A1),D1          ; Get least significant word of
                 *                              ; subtrahend.
00015C 2410         MOVE.L    (A0),D2           ; Get most significant word of
                 *                              ; minuend.
00015E 2611         MOVE.L    (A1),D3           ; Get most significant word of
                 *                              ; subtrahend.
000160 9081         SUB.L     D1,D0             ; Subtract least significant words.
000162 9583         SUBX.L    D3,D2             ; Subtract most significant words with
                 *                              ; extend.
000164 246F 0004    MOVE.L    4(A7),A2          ; Get adrs of return parameter.
000168 2540 0004    MOVE.L    D0,4(A2)          ; Return least significant word.
00016C 2482         MOVE.L    D2,(A2)           ; Return most significant word.
00016E 4E75         RTS
                 *  END   ( Procedure SUB_64
                    END

Errors=    0

                 "68000"

                 * FILE NAME:  UTIL_CODE:SS_DVM
                 * INITIAL DATE:  9/02/82
                 * REVISED DATE:  9/16/84

                 *********************************************************************
                 * CONTROL BOARD ROUTINES.                                           *
                 *********************************************************************

```

```
                        GLB     INIT_AME_CHIPS        ; Routine.
                        GLB     INIT_ADDER            ; Routine.
                        GLB     INIT_REGISTERS        ; Routine.
                        GLB     FLUSH_LAST_CNT        ; Routine.
                        GLB     TOGGLE_CLK_6          ; Routine.

 *************************************************************************
 * Routine to load the initial masks and values into the two AME chips   *
 * used by the Fast-sequencer.                                            *
 *                                                                        *
 * Declaration:                                                           *
 * PROCEDURE INIT_AME_CHIPS ( CUR_CNTRL_2, CUR_MEM_BYTE, LO_RG_MASK,      *
 *                            LO_RG_VAL, HI_RG_MASK, HI_RG_VAL,           *
 *                            LO_EQ_MASK, LO_EQ_VAL, HI_EQ_MASK,          *
 *                            HI_EQ_VAL:  L_INT ); EXTERNAL;              *
 *                                                                        *
 *************************************************************************
 * Local variables used:                                                  *
 *      CNTRL_VAL2                                                        *
 * Routine uses SAVE_RAM/RESTORE_RAM, which use registers D0-D5 for       *
 * buffer storage.  Therefore, this routine and all routines it calls     *
 * had better not use these registers.                                    *
 *************************************************************************
 * Algorithm:                                                             *
 *                                                                        *
 * o Set acquisition memory mode to "measurement" with address lines      *
 *   forced to FFFH so Clock Override #1 can be used.                     *
 * o Force all address lines to zero.                                     *
 * o Save the RAM contents located at address 000H.                       *
 * o Load RAM with "off" patterns for the X and Y generators.             *
 *                                                                        *
 * o Load RAM with lower mask for the range AME.                          *
 * o Load RAM with command to "zero the Fast-adder "B" operand and        *
 *   write the pattern into the lower mask register of the range AME".    *
 * o Switch I/O mode to MEASUREMENT.                                      *
 * o Send a Clock Override #1.                                            *
 * o Switch I/O mode back to LOAD.                                        *
 * o Do previous five steps again for each of the remaining three masks   *
 *   and four values yet to be loaded.                                    *
 *                                                                        *
 * o Restore the RAM contents located at address 000H.                    *
 * o Return address lines to their previous mode.                         *
 * o Return acquisition memory and address lines to previous modes. .     *
 *************************************************************************

000000               INIT_AME_CHIPS
000000 3C2F 0026                MOVE.W  38(A7),D6             ; Save MB control word.
000004 0046 0048                OR.W    #0048H,D6             ; MMO = 1, SET = 1.
000008 33C6 0080                MOVE.W  D6,MB_CNTRL_WORD

00000E 33EF 002A                MOVE.W  42(A7),CNTRL_VAL2     ; Save control word.
000016 0079 3800                OR.W    #3800H,CNTRL_VAL2     ; FAZ = 1, XAZ = 1, YAZ = 1.
00001E 33F9                     MOVE.W  CNTRL_VAL2,CNTRL_WORD2 ; Force address lines to zero.

000028 6100 01FE                BSR     SAVE_RAM              ; Save RAM_contents.

00002C 33FC 07BE                MOVE.W  #07BEH,Y_TERM         ; Turn off Y generator.
000034 33FC 033E                MOVE.W  #03BEH,X_TERM1        ; Turn off X generator.
00003C 33FC 0000                MOVE.W  #0000H,X_TERM2

000044 2C2F 0020                MOVE.L  32(A7),D6             ; Load mask pattern into RAM.
000048 33C6 0040                MOVE.W  D6,FS_TERM1
00004E 4846                     SWAP    D6
000050 33C6 0040                MOVE.W  D6,FS_TERM2
000056 33FC 0781                MOVE.W  #0781H,FS_TERM3       ; Turn off fast-sequencer functions,
                                                              ; force "B" operand to zero, and
                                                              ; command a write to the lower mask
                                                              ; register of the range AME.

00005E 6100 02AC                BSR     TOGGLE_MODES          ; Transfer mask pattern to AME chip.

000062 2C2F 0018                MOVE.L  24(A7),D6
000066 33C6 0040                MOVE.W  D6,FS_TERM1
00006C 4846                     SWAP    D6
```

```
00006E 33C6 0040          MOVE.W  D6,FS_TERM2
000074 33FC 07A1          MOVE.W  #07A1H,FS_TERM3     ; Command a write to the upper mask
                                                      ; register of the range AME.

00007C 6100 028E          BSR     TOGGLE_MODES

000080 2C2F 0010          MOVE.L  16(A7),D6
000084 33C6 0040          MOVE.W  D6,FS_TERM1
00008A 4846               SWAP    D6
00008C 33C6 0040          MOVE.W  D6,FS_TERM2
000092 33FC 0741          MOVE.W  #0741H,FS_TERM3     ; Command a write to the lower mask
                                                      ; register of the equate AME.

00009A 6100 0270          BSR     TOGGLE_MODES

00009E 2C2F 0008          MOVE.L  8(A7),D6
0000A2 33C6 0040          MOVE.W  D6,FS_TERM1
0000A8 4846               SWAP    D6
0000AA 33C6 0040          MOVE.W  D6,FS_TERM2
0000B0 33FC 0761          MOVE.W  #0761H,FS_TERM3     ; Command a write to the upper mask
                                                      ; register of the equate AME.

0000B8 6100 0252          BSR     TOGGLE_MODES

0000BC 2C2F 001C          MOVE.L  28(A7),D6
0000C0 33C6 0040          MOVE.W  D6,FS_TERM1
0000C6 4846               SWAP    D6
0000C8 33C6 0040          MOVE.W  D6,FS_TERM2
0000CE 33FC 0791          MOVE.W  #0791H,FS_TERM3     ; Command a write to the lower value
                                                      ; register of the range AME.

0000D6 6100 0234          BSR     TOGGLE_MODES

0000DA 2C2F 0014          MOVE.L  20(A7),D6
0000DE 33C6 0040          MOVE.W  D6,FS_TERM1
0000E4 4846               SWAP    D6
0000E6 33C6 0040          MOVE.W  D6,FS_TERM2
0000EC 33FC 07B1          MOVE.W  #07B1H,FS_TERM3     ; Command a write to the upper value
                                                      ; register of the range AME.

0000F4 6100 0216          BSR     TOGGLE_MODES

0000F8 2C2F 000C          MOVE.L  12(A7),D6
0000FC 33C6 0040          MOVE.W  D6,FS_TERM1
000102 4846               SWAP    D6
000104 33C6 0040          MOVE.W  D6,FS_TERM2
00010A 33FC 0751          MOVE.W  #0751H,FS_TERM3     ; Command a write to the lower value
                                                      ; register of the equate AME.

000112 6100 01F8          BSR     TOGGLE_MODES

000116 2C2F 0004          MOVE.L  4(A7),D6
00011A 33C6 0040          MOVE.W  D6,FS_TERM1
000120 4846               SWAP    D6
000122 33C6 0040          MOVE.W  D6,FS_TERM2
000128 33FC 0771          MOVE.W  #0771H,FS_TERM3     ; Command a write to the upper value
                                                      ; register of the equate AME.

000130 6100 01DA          BSR     TOGGLE_MODES

000134 6100 0118          BSR     RESTORE_RAM         ; Restore RAM contents.

000138 33EF 002A          MOVE.W  42(A7),CNTRL_WORD2  ; Restore control word.

000140 33EF 0026          MOVE.W  38(A7),MB_CNTRL_WORD ; Restore MB control word.
000148 4E75               RTS

     *****************************************************************************
     * Routine to load the initial value into the accumulator of the             *
     * Fast-adder.                                                               *
     *                                                                           *
     * Declaration:                                                              *
     * PROCEDURE INIT_ADDER ( CUR_CNTRL_2, CUR_MEM_BYTE, ADDER_VAL:              *
     *                        L_INT ); EXTERNAL;                                 *
```

```
*                                                                      *
************************************************************************
* Local variables used:                                                *
*      CNTRL_VAL2                                                      *
* Routine uses SAVE_RAM/RESTORE_RAM, which use registers D0-D5 for     *
* buffer storage.  Therefore, this routine and all routines it calls   *
* had better not use these registers.                                  *
************************************************************************
* Algorithm:                                                           *
*                                                                      *
* o Set acquisition memory mode to "measurement" with address lines    *
*    forced to FFFH so Clock Override #1 can be used.                  *
* o Force all address lines to zero.                                   *
* o Save the RAM contents located at address 000H.                     *
* o Load RAM with "off" patterns for the X and Y generators.           *
* o Load RAM with value for the Fast-adder accumulator.                *
* o Load RAM with command to "zero the Fast-adder "B" operand, disable *
*    any write to an AME chip, and save the sum in the accumulator"    *
* o Switch I/O mode to MEASUREMENT.                                    *
* o Send a Clock Override #1.                                          *
* o Switch I/O mode back to LOAD.                                      *
* o Restore the RAM contents located at address 000H.                  *
* o Return address lines to their previous mode.                       *
* o Return acquisition memory and address lines to previous modes.     *
************************************************************************

00014A                INIT_ADDER
00014A 3C2F 000A                 MOVE.W  10(A7),D6            ; Save MB control word.
00014E 0046 0048                 OR.W    #0048H,D6            ; MMO = 1, SET = 1
000152 33C6 0080                 MOVE.W  D6,MB_CNTRL_WORD

000158 33EF 000E                 MOVE.W  14(A7),CNTRL_VAL2    ; Save control word.
000160 0079 3800                 OR.W    #3800H,CNTRL_VAL2    ; FAZ = 1, XAZ = 1, YAZ = 1
000168 33F9                      MOVE.W  CNTRL_VAL2,CNTRL_WORD2  ; Force address lines to zero.

000172 6100 00D4                 BSR     SAVE_RAM             ; Save RAM contents.

000176 33FC 07EE                 MOVE.W  #07EEH,Y_TERM        ; Turn off Y generator.
00017E 33FC 03EE                 MOVE.W  #03EEH,X_TERM1       ; Turn off X generator.
000186 33FC 0000                 MOVE.W  #0000H,X_TERM2

00018E 2C2F 0004                 MOVE.L  4(A7),D6             ; Load value into RAM.
000192 33C6 0040                 MOVE.W  D6,FS_TERM1
000198 4846                      SWAP    D6
00019A 33C6 0040                 MOVE.W  D6,FS_TERM2
0001A0 33FC 03C1                 MOVE.W  #03C1H,FS_TERM3      ; Turn off fast-sequencer functions
                                                              ; and force "B" operand to zero.
                                                              ; Save the sum.

0001A8 6100 0162                 BSR     TOGGLE_MODES         ; Transfer value to accumulator.

0001AC 6100 00A0                 BSR     RESTORE_RAM          ; Restore RAM contents.

0001B0 33EF 000E                 MOVE.W  14(A7),CNTRL_WORD2   ; Restore control word.

0001B8 33EF 000A                 MOVE.W  10(A7),MB_CNTRL_WORD ; Restore MB control word.
0001C0 4E75                      RTS

************************************************************************
* Routine to initialize the X and Y generator state registers to zero  *
* and to initialize the dedicated functions register for all functions *
* false.                                                               *
*                                                                      *
* Declaration:                                                         *
* PROCEDURE INIT_REGISTERS ( CUR_CNTRL_2, CUR_MEM_BYTE:  L_INT );      *
*                               EXTERNAL;                              *
*                                                                      *
************************************************************************
* Local variables used:                                                *
*      CNTRL_VAL2                                                      *
* Routine uses SAVE_RAM/RESTORE_RAM, which use registers D0-D5 for     *
* buffer storage.  Therefore, this routine and all routines it calls   *
* had better not use these registers.                                  *
************************************************************************
* Algorithm:                                                           *
```

```
                    *                                                                      *
                    * o Set acquisition memory mode to "measurement" with address lines    *
                    *   forced to FFFH so Clock Override #1 can be used.                   *
                    * o Force all address lines to zero.                                   *
                    * o Save the RAM contents located at address 000H that will be altered.*
                    * o Load RAM with "off" patterns for the X and Y generators.           *
                    * o Load RAM with "off" patterns for Fast-sequencer functions, disable *
                    *   any write to an AME chip, and leave accumulator unchanged.         *
                    * o Switch I/O mode to MEASUREMENT.                                    *
                    * o Send a Clock Override #1.                                          *
                    * o Switch I/O mode back to LOAD.                                      *
                    * o Restore the RAM contents located at address 000H as necessary.     *
                    * o Return address lines to their previous mode.                       *
                    * o Return acquisition memory and address lines to previous modes.     *
                    ************************************************************************

0001C2              INIT_REGISTERS
0001C2 3C2F 0006               MOVE.W  6(A7),D6               ; Save MB control word.
0001C6 0046 0048               OR.W    #0048H,D6              ; MMO = 1, SET = 1.
0001CA 33C6 0080               MOVE.W  D6,MB_CNTRL_WORD

0001D0 33EF 000A               MOVE.W  10(A7),CNTRL_VAL2      ; Get current control word.
0001D8 0079 3800               OR.W    #3800H,CNTRL_VAL2      ; FAZ = 1, XAZ = 1, YAZ = 1.
0001E0 33F9                    MOVE.W  CNTRL_VAL2,CNTRL_WORD2 ; Force address lines to zero.

0001EA 6100 003C               BSR     SAVE_RAM               ; Save RAM contents.

0001EE 33FC 07BE               MOVE.W  #07BEH,Y_TERM          ; Turn off Y generator and set
                                                              ; next state to 0H.
0001F6 33FC 03BE               MOVE.W  #03BEH,X_TERM1         ; Turn off X generator.
0001FE 33FC 0000               MOVE.W  #0000H,X_TERM2         ; Set next state to 0H.

000206 33FC 07C1               MOVE.W  #07C1H,FS_TERM3        ; Turn off fast-sequencer functions
                                                              ; and allow no writes to AME chips.
                                                              ; Do not save sum.

00020E 6100 00FC               BSR     TOGGLE_MODES           ; Transfer zero to X and Y generator
                                                              ; state registers and an "all functions
                                                              ; false" pattern into the dedicated
                                                              ; function register.

000212 6100 003A               BSR     RESTORE_RAM            ; Restore RAM contents.

000216 33EF 000A               MOVE.W  10(A7),CNTRL_WORD2     ; Restore control word.

00021E 33EF 0006               MOVE.W  6(A7),MB_CNTRL_WORD    ; Restore MB control word.
000226 4E75                    RTS

                    ************************************************************************
                    * Routine to save RAM contents located at address 0000H.  Registers    *
                    * D0-D5 are used to save the locations.                                *
                    ************************************************************************

000228              SAVE_RAM
000228 3039 0040               MOVE.W  Y_TERM,D0              ; Save RAM contents.
00022E 3239 0040               MOVE.W  X_TERM1,D1
000234 3439 0040               MOVE.W  X_TERM2,D2
00023A 3639 0040               MOVE.W  FS_TERM1,D3
000240 3839 0040               MOVE.W  FS_TERM2,D4
000246 3A39 0040               MOVE.W  FS_TERM3,D5
00024C 4E75                    RTS

                    ************************************************************************
                    * Routine to restore RAM contents located at address 0000H.  Registers *
                    * D0-D5 are used to restore the locations.                             *
                    ************************************************************************

00024E              RESTORE_RAM
00024E 33C0 0040               MOVE.W  D0,Y_TERM              ; Restore RAM contents.
000254 33C1 0040               MOVE.W  D1,X_TERM1
00025A 33C2 0040               MOVE.W  D2,X_TERM2
000260 33C3 0040               MOVE.W  D3,FS_TERM1
000266 33C4 0040               MOVE.W  D4,FS_TERM2
00026C 33C5 0040               MOVE.W  D5,FS_TERM3
000272 4E75                    RTS
```

```
           ******************************************************************************
           * Routine to switch the I/O mode into LOAD.                                  *
           ******************************************************************************
           * Local variables used:                                                      *
           *     CNTRL_VAL2                                                             *
           ******************************************************************************

000279     SWITCH_TO_LOAD
000279 0279 3FFF        AND.W   #3FFFH,CNTRL_VAL2       ; IM1 = 0, IM0 = 0.
00027C 33F9             MOVE.W  CNTRL_VAL2,CNTRL_WORD2  ; Set transition state.
000286 0079 4000        OR.W    #4000H,CNTRL_VAL2       ; IM1 = 0, IM0 = 1.
00028E 33F9             MOVE.W  CNTRL_VAL2,CNTRL_WORD2  ; Set LOAD state.
000298 4E75             RTS

           ******************************************************************************
           * Routine to switch the I/O mode into MEASUREMRNT.                           *
           ******************************************************************************
           * Local variables used:                                                      *
           *     CNTRL_VAL2                                                             *
           ******************************************************************************

00029A     SWITCH_TO_MEAS
00029A 0279 3FFF        AND.W   #3FFFH,CNTRL_VAL2       ; IM1 = 0, IM0 = 0.
0002A2 33F9             MOVE.W  CNTRL_VAL2,CNTRL_WORD2  ; Set transition state.
0002AC 0079 8000        OR.W    #8000H,CNTRL_VAL2       ; IM1 = 1, IM0 = 0.
0002B4 33F9             MOVE.W  CNTRL_VAL2,CNTRL_WORD2  ; Set MEASUREMENT state.
0002BE 4E75             RTS

           ******************************************************************************
           * Routine to send one CLOCK OVERRIDE #1 pulse.                               *
           ******************************************************************************
           * Local variables used:                                                      *
           *     CNTRL_VAL2                                                             *
           ******************************************************************************

0002C0     CLK_OVERRIDE1
0002C0 0079 0040        OR.W    #0040H,CNTRL_VAL2       ; CK1 = 1.
0002C8 33F9             MOVE.W  CNTRL_VAL2,CNTRL_WORD2
0002D2 0279 FFBF        AND.W   #0FFBFH,CNTRL_VAL2      ; CK1 = 0.
0002DA 33F9             MOVE.W  CNTRL_VAL2,CNTRL_WORD2
0002E4 4E75             RTS

           ******************************************************************************
           * Routine to send one CLOCK OVERRIDE #2 pulse.                               *
           ******************************************************************************
           * Local variables used:                                                      *
           *     CNTRL_VAL2                                                             *
           ******************************************************************************

0002E6     CLK_OVERRIDE2
0002E6 0079 0080        OR.W    #0080H,CNTRL_VAL2       ; CK2 = 1.
0002EE 33F9             MOVE.W  CNTRL_VAL2,CNTRL_WORD2
0002F8 0279 FF7F        AND.W   #0FF7FH,CNTRL_VAL2      ; CK2 = 0.
000300 33F9             MOVE.W  CNTRL_VAL2,CNTRL_WORD2
00030A 4E75             RTS

           ******************************************************************************
           * Routine to toggle from load mode to measurement mode, send one CLOCK *
           * OVERRIDE #1 pulse, then toggle back to load mode.                          *
           ******************************************************************************

00030C     TOGGLE_MODES
00030C 618C             BSR     SWITCH_TO_MEAS
00030E 61B0             BSR     CLK_OVERRIDE1
000310 6100 FF62        BSR     SWITCH_TO_LOAD
000314 4E75             RTS
           ******************************************************************************
           * Routine to flush the last value from the floating point counter.          *
           ******************************************************************************
           * Local variables used:                                                      *
           *     CNTRL_VAL2                                                             *
           ******************************************************************************
           *                                                                            *
           * Declaration:                                                               *
```

```
                  *                                                                  *
                  * PROCEDURE FLUSH_LAST_CNT ( CUR_CNTRL_2:  L_INT ); EXTERNAL;      *
                  *                                                                  *
                  ********************************************************************

000316            FLUSH_LAST_CNT
000316 33EF 0006                MOVE.W  6(A7),CNTRL_VAL2        ; Get current cntrl wrd.
00031E 61A0                     BSR     CLK_OVERRIDE1           ; Send pulse.
000320 4E75                     RTS

                  ********************************************************************
                  * Routine to send one CLOCK OVERRIDE #6 pulse.                     *
                  ********************************************************************
                  * Local variables used:                                            *
                  *     CNTRL_VAL2                                                   *
                  ********************************************************************
                  *                                                                  *
                  * Declaration:                                                     *
                  *                                                                  *
                  * PROCEDURE TOGGLE_CLK_6 ( CUR_CNTRL_2:  L_INT ); EXTERNAL;        *
                  *                                                                  *
                  ********************************************************************

000322            TOGGLE_CLK_6
000322 33EF 0006                MOVE.W  6(A7),CNTRL_VAL2        ; Get current cntrl wrd.
00032A 61BA                     BSR     CLK_OVERRIDE2           ; Send pulse.
00032C 4E75                     RTS

                  ********************************************************************
                  * CONTROL BOARD EQUATES.                                           *
                  ********************************************************************

        <00418000> CNTRL_WORD2  EQU     418000H
        <0040A000> FS_TERM3     EQU     40A000H
        <00408000> FS_TERM2     EQU     408000H
        <00406000> FS_TERM1     EQU     406000H
        <00404000> X_TERM2      EQU     404000H
        <00402000> X_TERM1      EQU     402000H
        <00400000> Y_TERM       EQU     400000H

                  ********************************************************************
                  * MEMORY/CPU BOARD ROUTINES.                                       *
                  ********************************************************************

                                GLB     CLEAR_FP_CNTR           ; Routines.
                                GLB     INIT_MAC

                  ********************************************************************
                  * Routine to read the Floating Point Counter value and then clear the  *
                  * Floating Point Counter and the Floating Point Counter Pipeline   *
                  * Register.  Note that this routine may modify the Memory Address  *
                  * Counter and will modify location FFFH in acquisition memory.     *
                  * Note that this routine expects that the Floating Point Counter is *
                  * in "counting states" mode when called.                           *
                  *                                                                  *
                  * Declaration:                                                     *
                  * PROCEDURE CLEAR_FP_CNTR ( CUR_CNTRL_2, CUR_MEM_BYTE:  L_INT; VAR *
                  *                           GREY_COUNT:  L_INT ); EXTERNAL;        *
                  *                                                                  *
                  ********************************************************************
                  * Local variables used:                                            *
                  *     CNTRL_VAL2                                                   *
                  * Routine uses SAVE_RAM/RESTORE_RAM, which use registers D0-D5 for *
                  * buffer storage.  Therefore, this routine and all routines it calls *
                  * had better not use these registers.                              *
                  ********************************************************************
                  * Algorithm:                                                       *
                  *                                                                  *
                  * o Set acquisition memory mode to "measurement" with address lines *
                  *   forced to FFFH so Clock Override #1 can be used.               *
                  * o Set STORE_H line high and RUN_L line low from control board.   *
                  *   Control board operations as follows:                           *
                  *     - Force all address lines to zero.                           *
```

```
*      - Save the RAM contents located at address 000H that will be      *
*        altered.                                                        *
*      - Load RAM with "off" pattern for Y generator.                    *
*      - Load RAM with "on" pattern for the "store" function and "off"   *
*        pattern for all other functions for X generator.                *
*      - Load RAM with "off" patterns for Fast-sequencer functions and   *
*        also to disable any write to an AMF chip.                       *
*      - Load RAM with a "no save" command to the Fast-adder             *
*        accumulator.                                                    *
*      - Switch I/O mode to MEASUREMENT.                                 *
*      - Send a Clock Override #1 to set STORE_H line high.              *
*      - Set "RUN" control bit for a forced run to get RUN_L line low.   *
*                                                                        *
* o Send one Clock Override #2 command to control board to pulse         *
*   CLK6_L once to transfer the current value in the Floating Point      *
*   counter to the Pipeline register and then clear the Floating         *
*   Point counter to FFFFFH.                                             *
* o Send one Clock Override #1 command to pulse CLK2_L once to store     *
*   the value in the Pipeline register into the acquisition RAM.         *
* o Send one Clock Override #2 command to pulse CLK6_L once to move      *
*   the "clear" value (FFFFFH) into the Pipeline register.               *
*                                                                        *
* o Set acquisition memory mode to "load/unload" with address lines      *
*   left forced to FFFH.                                                 *
* o Read and save location FFFH of the "Count" fields.  This is what     *
*   was in the FP Counter.(Masks off flag bits)                          *
* o Set acquisition memory mode back to "measurement" with address       *
*   lines still forced to FFFH.                                          *
*                                                                        *
* o Set STORE_H line back to low and RUN_L line back to high from        *
*   control board.  Control board operations as follows:                 *
*     - Set "RUN" control bit for normal run/halt to return RUN_L to     *
*       high.                                                            *
*     - Switch I/O mode back to LOAD.                                    *
*     - Load RAM with "off" pattern for X generator.                     *
*     - Switch I/O mode to MEASUREMENT.                                  *
*     - Send a Clock Override #1 to set STORE_H line back low.           *
*     - Switch I/O mode back to LOAD.                                    *
*     - Restore the RAM contents located at address 000H as necessary.   *
*     - Return address lines to their previous mode.                     *
*                                                                        *
* o Return acquisition memory and address lines to previous modes.       *
**************************************************************************

00032E              CLEAR_FP_CNTR
00032E 3C2F 000A                 MOVE.W  10(A7),D6              ; Save MB control word:  will be used later!
000332 0046 0048                 OR.W    #0048H,D6              ; MMO = 1, SET = 1.
000336 33C6 0080                 MOVE.W  D6,MB_CNTRL_WORD

00033C 33EF 000E                 MOVE.W  14(A7),CNTRL_VAL2
000344 0079 3800                 OR.W    #3800H,CNTRL_VAL2      ; FAZ = 1, XAZ = 1, YAZ = 1.
00034C 33F9                      MOVE.W  CNTRL_VAL2,CNTRL_WORD2 ; Force address lines to zero.

000356 6100 FED0                 BSR     SAVE_RAM               ; Save RAM contents.

00035A 33FC 07BE                 MOVE.W  #07BEH,Y_TERM          ; Turn off Y generator.
000362 33FC 039E                 MOVE.W  #039EH,X_TERM1         ; Turn on "store" function and off
00036A 33FC 0000                 MOVE.W  #0000H,X_TERM2         ; all other functions for X generator.
000372 33FC 07C1                 MOVE.W  #07C1H,FS_TERM3        ; Turn off fast-sequencer functions
                                                                ; and allow no writes to AMF chips.
                                                                ; Do not save sum.
00037A 6100 FF1E                 BSR     SWITCH_TO_MEAS
00037E 6100 FF40                 BSR     CLK_OVERRIDE1          ; Transfer "store" true to dedicated
                                                                ; function register.

000382 0279 FFEF                 AND.W   #0FFEFH,CNTRL_VAL2     ; RUN = 0.
00038A 33F9                      MOVE.W  CNTRL_VAL2,CNTRL_WORD2 ; Cause RUN_L to go low.

000394 6100 FF50                 BSR     CLK_OVERRIDE2          ; Pulse CLK6_L once to store the counter value
                                                                ; into the pipeline register and "clear" the FP counter.
000398 6100 FF26                 BSR     CLK_OVERRIDE1          ; Pulse CLK2_L once to store pipeline register
                                                                ; value into acquisition memory.
00039C 6100 FF48                 BSR     CLK_OVERRIDE2          ; Pulse CLK6_L once to store "clear" into pipeline register

0003A0 0246 FFBF                 AND.W   #0FFBFH,D6             ; MMO = 0:  MB control word saved on entry in D6!
```

```
0003A4 33C6 0080                 MOVE.W  D6,MB_CNTRL_WORD

0003AA 206F 0004                 MOVEA.L 4(A7),A0              ; Get adrs of return parameter.
0003AE 3179 0081                 MOVE.W  COUNT,2(A0)           ; Read location FFFH of "Count" fields.
0003B6 3E39 0081                 MOVE.W  FLAG_CNT_OPC,D7       ; Note that RAM address is forced FFFH.
0003BC E94F                      LSL.W   #4,D7                 ; Mask off flag bits (KEVIN)
0003BE E84F                      LSR.W   #4,D7                 ; Mask off flag bits (KEVIN)
0003C0 E04F                      LSR.W   #8,D7                 ; Format upper nibble so it appears in bits 0-3.
0003C2 3087                      MOVE.W  D7,(A0)

0003C4 0046 0040                 OR.W    #0040H,D6             ; MMO = 1:  MB control word saved on entry in D6!
0003C8 33C6 0080                 MOVE.W  D6,MB_CNTRL_WORD

0003CE 0079 0010                 OR.W    #0010H,CNTRL_VAL2     ; RUN = 1.
0003D6 33F9                      MOVE.W  CNTRL_VAL2,CNTRL_WORD2 ; Cause RUN_L to go back high.

0003E0 6100 FE92                 BSR     SWITCH_TO_LOAD
0003E4 33FC 03BE                 MOVE.W  #03BEH,X_TERM1        ; Turn off X generator.

0003EC 6100 FF1E                 BSR     TOGGLE_MODES          ; Transfer "store" false to dedicated
                                                               ; function register.

0003F0 6100 FE5C                 BSR     RESTORE_RAM           ; Restore RAM contents.

0003F4 33EF 000E                 MOVE.W  14(A7),CNTRL_WORD2    ; Restore control word.

0003FC 33EF 000A                 MOVE.W  10(A7),MB_CNTRL_WORD  ; Restore MB control word.
000404 4E75                      RTS


                 ***************************************************************************
                 * Routine to initialize the Memory Address Counter and insure that the   *
                 * Memory Wrap flip-flop is reset.                                         *
                 *                                                                         *
                 * Declaration:                                                            *
                 * PROCEDURE INIT_MAC ( START_MAC:  S_INT; VAR CUR_MEM_BYTE:  L_INT );     *
                 *                      EXTERNAL;                                          *
                 *                                                                         *
                 ***************************************************************************
                 * Algorithm:                                                              *
                 *                                                                         *
                 * o Make sure the Memory Address Counter is in load mode (LDA control     *
                 *   bit is low). Also guarantees Memory Wrap flip-flop is reset.          *
                 * o Clear the Memory Address Counter by changing LDA to high with a       *
                 *   control word write to location START_MAC*2 of the control word        *
                 *   memory space.  LDA must be left high hereafter or the Memory          *
                 *   Address Counter value may be altered.  Also, a Clock Override #2      *
                 *   on the control board with the STORE_H line high will alter the        *
                 *   value in the Memory Address Counter.                                  *
                 ***************************************************************************

000406           INIT_MAC
000406 206F 0004                 MOVEA.L 4(A7),A0
00040A 0268 00DF                 ANDI.W  #00DFH,2(A0)          ; Make sure LDA = 0.
000410 33E8 0002                 MOVE.W  2(A0),MB_CNTRL_WORD
000418 0068 0020                 OR.W    #0020H,2(A0)          ; LDA = 1.
00041E 302F 0008                 MOVE.W  8(A7),D0              ; Get START_MAC.
000422 0280                      ANDI.L  #0FFFH,D0
000428 E388                      LSL.L   #1,D0                 ; Multiply by 2 and add
00042A 227C                      MOVEA.L #MB_CNTRL_WORD,A1     ; in control word adrs.
000430 33A8 0002                 MOVE.W  2(A0),0(A1,D0)        ; Set Memory Address
                                                               ; Counter to START_MAC.
000436 4E75                      RTS


                 ***************************************************************************
                 * MEMORY/CPU BOARD EQUATES.                                               *
                 ***************************************************************************

     <00818000>  FLAG_CNT_OPC    EQU     818000H
     <0081A000>  COUNT           EQU     81A000H
     <0080E000>  MB_CNTRL_WORD   EQU     80E000H

                 ***************************************************************************
                 * LOCAL DATA AREA.                                                        *
                 ***************************************************************************
```

```
                                   DATA
000000 0000         CNTRL_VAL2     DC.W    0                      ; Control word #2 value.

                    *************************** End of Document ****************************

Errors=    0
                    "68000"
                    GLOBAL GREY_BIN
                    *************************************************************************************
                    ***********  GREY_BIN  **************************************************************
                    *************************************************************************************
                    * CONVERTS 20 BIT FLOATING PT GREY CODE FROM THE KC9A TO 41 BIT FIXED POINT BINARY   *
                    * PROCEDURE GREY_BIN(GREY:INTEGER,VAR BINARY:ARRAY[0..1] OF INTEGER;VAR RESET:BOOLEAN) *
                    *************************************************************************************
          <0000>    RESET       EQU     A0               ADDRESS OF RESET FLAG
          <0001>    BINARY      EQU     A1               ADDRESS OF 64 BIT BINARY RESULT
          <0000>    BIN         EQU     D0               20 BIT FLOATING PT BINARY
          <0001>    GREY        EQU     D1               20 BIT FLOATING PT GREY CODE
          <0001>    FIXEDL      EQU     D1               FIXED POINT BINARY LEAST SIG 32 BITS
          <0002>    FIXEDM      EQU     D2               FIXED POINT BINARY MOST  SIG 32 BITS
          <0003>    EXP         EQU     D3               4 BIT EXPONET
          <0004>    N           EQU     D4               COUNTER & INDEX REGISTER
          <0005>    TEMP        EQU     D5               TEMPORARY REGISTER
          <0006>    SHIFTCNT1   EQU     D6               SHIFTCOUNTER #1
          <0007>    SHIFTCNT2   EQU     D7               SHIFTCOUNTER #2


                                **********  CONVERT 20 BIT GREY CODE TO 20 BIT BINARY
000000 206F 0004    GREY_BIN    MOVE.L  4(A7),RESET      GET ADDRESS OF RESET FLAG
000004 226F 0008                MOVE.L  8(A7),BINARY     GET ADDRESS OF OF 64 BIT BINARY RESLUT
000008 222F 000C                MOVE.L  12(A7),GREY      GET 20 BIT GREY CODE
00000C 2001                     MOVE.L  GREY,BIN         INITIALIZE 20 BIT BINARY
00000E 7812                     MOVEQ   #18,N            INITIALIZE COUNTER FOR 19 ITERATIONS
000010 E288         LOOP        LSR.L   #1,BIN
000012 B380                     EOR.L   GREY,BIN
000014 51CC FFFA                DBF     N,LOOP

                                **********  SPLIT UP MANTISSA AND EXPONET AND RIGHT JUSTIFY
000018 4282                     CLR.L   FIXEDM           INITIALIZE THE FIXED POINT MS 32BITS
00001A 2200                     MOVE.L  BIN,FIXEDL       INITIALIZE THE FIXED POINT LS 32BITS
00001C 0281                     ANDI.L  #1FFFFH,FIXEDL   AND MASK TO 17 BITS
000022 0680                     ADDI.L  #00060000H,BIN   ADD 3 TO EXPONET TO NORMALIZE
000028 0280                     ANDI.L  #000FFFFFH,BIN   MASK EXPONET TO 3 BITS
00002E 2600                     MOVE.L  BIN,EXP          INITIALIZE THE EXPONET REGISTER
000030 2C3C                     MOVE.L  #17,SHIFTCNT1    RIGHT JUSTIFY EXPONET IN EXP REGISTER
000036 ECAB                     LSR.L   SHIFTCNT1,EXP    RIGHT JUSTIFY EXPONET IN EXP REGISTER

                                **********  IF EXP=0 THEN (IF MANTISSA<=43689 THEN EXP:=8)
000038 6600 0014                BNE     RESETTEST        EXPONET<>0 SKIP THIS TEST
00003C 0C81                     CMP.L   #43689,FIXEDL    STATUS REG=(MANTISSA-43689)
000042 6E00 000A                BGT     RESETTEST        MANTISSA > 43689  ==> RESETTEST
000046 7608                     MOVEQ   #8,EXP           FIX EXPONIT REGISTER
000048 0080                     OR.L    #00100000H,BIN   FIX EXPONIT IN FLOATING POINT DATA

                                **********  IF EXP IS 0,1,2 THEN COUNTER DID NOT RESET WHEN UNLOADED
00004E 10BC 0001    RESETTEST   MOVE.B  #1,[RESET]       INITIALIZE RESET TO "TRUE"
000052 0C43 0002                CMP.W   #2,EXP
000056 6E00 0006                BGT     CONVERT          BRANCH IF EXP>2 (RESET=TRUE)
00005A 10BC 0000                MOVE.B  #0,[RESET]       EXPONET=0,1,2   (RESET:=FLASE).
                                **********  SHIFT MANTISSA LEFT DEPENDING ON EXPONET
00005E 41F9         CONVERT     LEA     SHIFT_TBL,A0     GET ADDRESS OF SHIFT TABLE
000064 4246                     CLR     SHIFTCNT1
000066 1C30 3000                MOVE.B  0(A0,EXP),SHIFTCNT1
00006A 6700 0018                BEQ     NOW_ADD          IF SHIFTCOUNT IS 0 THEN GO TO NOW ADD
00006E 0C46 000A                CMP     #10,SHIFTCNT1    IS SHIFTCOUNT 3 OR 10
000072 6F00 000E                BLE     SHIFTLEFT        YES, SHIFT LS-32 BITS, NO OVERFLOW INTO MS-32BITS
                                **********  GET MS-32BITS BY SHIFTING RIGHT (32-SHIFTCOUNT)
000076 2401                     MOVE.L  FIXEDL,FIXEDM    INITIALIZE MS-32BITS
000078 2E3C                     MOVE.L  #32,SHIFTCNT2    INITIALIZE RIGHT SHIFT COUNT
00007E 9E46                     SUB     SHIFTCNT1,SHIFTCNT2
000080 EEAA                     LSR.L   SHIFTCNT2,FIXEDM SHIFT MS-32 BITS RIGHT
000082 EDA9         SHIFTLEFT   LSL.L   SHIFTCNT1,FIXEDL SHIFT LS-32 BITS LEFT


                                **********  ADD OFFSET DEPENDING ON EXPONET
```

```
000084 41F9        NOW_ADD   LEA      ADD_TBL,A0
00008A 2003                  MOVE.L   EXP,N             INITIALIZE INDEX REGISTER N
00008C E70C                  LSL.B    #3,N              MULT BY 8 TO FIND INDEX INTO ADD_TBL
00008E D2B0 4004             ADD.L    4(A0,N),FIXEDL    ADD LS-32 BITS
000092 2A30 4000             MOVE.L   0(A0,N),TEMP      GET MS-32 BITS
000096 DB85                  ADDX.L   TEMP,FIXEDM       ADD MS-32 BITS W/EXTEND
                             *!!!!!!!!! INC COUNTER FOR HARDWARE PROP DELAY HERE!!!!!!!!!
000098 22C2                  MOVE.L   FIXEDM,(BINARY)+  MOVE MS-32 BITS TO RESULT
00009A 22C1                  MOVE.L   FIXEDL,(BINARY)+  MOVE LS-32 BITS TO RESULT
00009C 4E75                  RTS

                             DATA

000000 00          SHIFT_TBL DC.B     0                          EXPONET=0
000001 00                    DC.B     0                          EXPONET=1
000002 00                    DC.B     0                          EXPONET=2
000003 00                    DC.B     0                          EXPONET=3
000004 00                    DC.B     0                          EXPONET=4
000005 03                    DC.B     3                          EXPONET=5
000006 0A                    DC.B     10                         EXPONET=6
000007 11                    DC.B     17                         EXPONET=7
000008 18                    DC.B     24                         EXPONET=8
00000A FFFF FFFF   ADD_TBL   DC.L     0FFFFFFFFH, 0FFFF5556H     EXPONET=0
000012 0000 0000             DC.L     00000000H,  00015556H      EXPONET=1
00001A 0000 0000             DC.L     00000000H,  00035556H      EXPONET=2
000022 0000 0000             DC.L     00000000H,  00055556H      EXPONET=3
00002A 0000 0000             DC.L     00000000H,  00075556H      EXPONET=4
000032 0000 0000             DC.L     00000000H,  00095556H      EXPONET=5
00003A 0000 0000             DC.L     00000000H,  00195556H      EXPONET=6
000042 0000 0000             DC.L     00000000H,  08195556H      EXPONET=7
00004A 0000 0004             DC.L     00000004H,  08195556H      EXPONET=8
                             END

Errors=    0
```

```
00000000  1  "68000"
00000000  1  $EXTENSIONS ON$
00000000  1  $LID_ABS_LONG$
00000000  1  $CALL_ABS_LONG$
00000000  1  PROGRAM FORMATTER;
00000000  1  (*****************************************************************************)
00000000  1  (*********  FORMATTER  *******************************************************)
00000000  1  (*****************************************************************************)
00000000  1  (* ROUTINES FOR FORMATTING 8,16,32 BIT SIGNED AND UNSIGNED INTEGERS **********)
00000000  1  (*****************************************************************************)
00000000  1
00000000  1  (*******************************************************************)
00000000  1  (********* CONSTANTS ***********************************************)
00000000  1  (*******************************************************************)
00000000  1  CONST
00000000  1  LEFT            =1;
00000000  1  RIGHT           =-1;
00000000  1  HEX=3000H;      (*   BASE SYMBOL, NO ZERO SUPPRESS*)
00000000  1  OCT=3040H;      (*   BASE SYMBOL, NO ZERO SUPPRESS*)
00000000  1  BIN=3080H;      (*   BASE SYMBOL, NO ZERO SUPPRESS*)
00000000  1  DEC=22C0H;      (* NO BASE SYMBOL,    ZERO SUPPRESS*)
00000000  1
00000000  1  (*******************************************************************)
00000000  1  (********* TYPES  **************************************************)
00000000  1  (*******************************************************************)
00000000  1  TYPE
00000000  1  INT             =SIGNED_16;
00000000  1  POINTER         =^INT;                 (*GENERIC POINTER TYPE*)
00000000  1  CHAR_PTR        =^CHAR;
00000000  1  TABLE_TYPE =ARRAY[0..2] OF INT;
00000000  1  DEST_TYPE  =ARRAY[0..31] OF CHAR;
00000000  1
00000000  1  (*****************************************************************************)
00000000  1  (*  LOCAL STATICS MAY BE IN ANY L-MAP BUT MUST ALL BE IN SAME L_MAP.          *)
00000000  1  (*  THEY ARE NOT DYNAMIC FOR FEAR THAT THEY COULD CROSS AN L-MAP BOUNDRY.     *)
00000000  1  (*****************************************************************************)
00000000  1
00000000  1  VAR
00000000  1  LOCAL_SOURCE: ARRAY[0..1] OF INT;
00000004  1  LOCAL_DEST  : DEST_TYPE;
```

```
00000024 1 TABLE       : TABLE_TYPE;            (*GORDONS FORMATTER TABLE*)
00000000 1
00000000 1 (*********************************************************************************************)
00000000 1 (********** EXTERNAL PROCEDURES ***************************************************************)
00000000 1 (*********************************************************************************************)
00000000 1 PROCEDURE  P_FORMATTER    (VAR TABLE:TABLE_TYPE; VAR DEST:DEST_TYPE);EXTERNAL;
0000002A 1
0000002A 1 (*********************************************************************************************)
0000002A 1 (********** FORMAT INTEGERS *******************************************************************)
0000002A 1 (*********************************************************************************************)
0000002A 1 (* FORMAT BYTES, WORDS OR LONG WORD  INTEGERS IN SIGNED OR UNSIGNED FORM.                      *)
0000002A 1 (*********************************************************************************************)
0000002A 1 (* SIGNED      TRUE==> SIGNED STRUCTURE                                                      *)
0000002A 1 (* SOURCE      ADDRESS OF SOURCE DATA  (MAY BE ANYWHERE IN 68000 MEMORY)                     *)
0000002A 1 (* SOURCESIZE  #OF BYTES OF SOURCE DATA                                                      *)
0000002A 1 (* DEST        ADDRESS OF DESTINATION  (MAY BE ANYWHERE IN 68000 MEMORY)                     *)
0000002A 1 (* DESTSIZE    CALLED WTH MAX DEST FIELD SIZE (CHARACTERS), RET ACUTAL SIZE IFF JUSTIFY=LEFT. *)
0000002A 1 (* BASE        FORMATTING BASE = 2,8,10 OR 16                                                *)
0000002A 1 (* JUSTIFY      1==>LEFT  ==> LEFT  JUSTIFY, LENGTH RETURNED IN DESTSIZE.                    *)
0000002A 1 (* JUSTIFY     -1==>RIGHT ==> RIGHT JUSTIFY, LEFT TRUNCATE, BLANK FILL IN FIELD OF SIZE DESTSIZE.*)
0000002A 1 (*********************************************************************************************)
0000002A 1 $GLOBPROC ON$
00000000 1 PROCEDURE FORMAT       (SIGNED:BOOLEAN; SOURCE:POINTER; SOURCESIZE:INT;
00000000 2                        DEST:CHAR_PTR; VAR DESTSIZE:INT; BASE:INT; JUSTIFY:INT);
00000000 2
00000000 2 VAR
00000000 2 J        :INT;
00000002 2 FIRST    :INT;
00000004 2 NEGATIVE:BOOLEAN;
00000006 2 TEMP   :INT;                      (*FOR REARRANGING WORDS IN DATA*)
00000008 2 P1      :^BYTE;                   (*POINTER FOR COMPLIMENTING BYTE DATA*)
0000000C 2 P2      :^INT;                    (*POINTER FOR COMPLIMENTING INT DATA*)
00000010 2 P4      :^INTEGER;                (*POINTER FOR COMPLIMENTING INTEGER DATA*)
00000004 2
00000004 2 (*************************************************************************************)
00000004 2 (********** FORMAT INTEGERS MAIN PROGRAM *********************************************)
00000004 2 (*************************************************************************************)
00000004 2 BEGIN
00000004 2 LOCAL_SOURCE[0]:=SOURCE^;    (*PUT 2 SOURCE SOURCESIZE IN TEMP ARRAY, ALL 4 MAY NOT BE VALID*)
0000000C 2 SOURCE:=POINTER(INTEGER(SOURCE)+2);    (*PUT 2 SOURCE SOURCESIZE IN TEMP ARRAY, ALL 4 MAY NOT BE VALID*)
00000016 2 LOCAL_SOURCE[1]:=SOURCE^;    (*PUT 2 SOURCE SOURCESIZE IN TEMP ARRAY, ALL 4 MAY NOT BE VALID*)
0000001E 2 IF SIGNED AND (LOCAL_SOURCE[0]<0) THEN
00000032 2   BEGIN
00000032 2   NEGATIVE:=TRUE;
00000038 2   CASE SOURCESIZE OF
00000042 2     1:  BEGIN P1:=ADDR(LOCAL_SOURCE);  P1^:=-P1^;  END;
00000054 2     2:  BEGIN P2:=ADDR(LOCAL_SOURCE);  P2^:=-P2^;  END;
00000066 2     4:  BEGIN P4:=ADDR(LOCAL_SOURCE);  P4^:=-P4^;  END;
00000078 2     OTHERWISE;
00000078 2     END (*END CASE*)
000000A0 2   END
000000A4 2   ELSE NEGATIVE:=FALSE;
000000A8 2 CASE BASE OF
000000B2 2   2 :TABLE[0]:=BIN+DESTSIZE-1; (*   DISPLAY BASE ==> #DIGITS=DESTSIZE-1*)
000000C6 2   8 :TABLE[0]:=OCT+DESTSIZE-1; (*   DISPLAY BASE ==> #DIGITS=DESTSIZE-1*)
000000DA 2   10:TABLE[0]:=DEC+DESTSIZE  ; (*NO DISPLAY BASE ==> #DIGITS=DESTSIZE  *)
000000EC 2   16:TABLE[0]:=HEX+DESTSIZE-1; (*   DISPLAY BASE ==> #DIGITS=DESTISZE-1*)
00000100 2   OTHERWISE;
00000100 2   END; (*END CASE*)
0000013E 2 CASE SOURCESIZE OF
00000148 2   1 :LOCAL_SOURCE[0]:=SHIFT(LOCAL_SOURCE[0],-8);(*PUT BYTE IN LSB OF WORD FOR GORDON*)
00000156 2   2 :;
0000015A 2   4 :BEGIN  (*FORMAT 4 BYTE*)
0000015A 2      TEMP:=LOCAL_SOURCE[0];  LOCAL_SOURCE[0]:=LOCAL_SOURCE[1];  LOCAL_SOURCE[1]:=TEMP; (*PUT LSW FIRST FOR GORDON*)
0000016C 2      TABLE[0]:=TABLE[0]+0400H;  (*2 WORD SOURCE*)
00000172 2      END;   (*FORMAT 4 BYTE*)
00000176 2   OTHERWISE;
00000176 2   END; (*END CASE*)
0000019E 2 $WARN OFF$
0000019E 2 TABLE[1]:=SHIFT(SHIFT(INT(ADDR(LOCAL_SOURCE)),+1),-2)+4000H;    (*COMPUTE BPC SPACE SOURCE ADDRESS*)
000001B0 2 TABLE[2]:=0;    (*END OF TABLE*)
000001B4 2 P_FORMATTER(TABLE,LOCAL_DEST);
000001C4 2 $WARN ON $
000001C4 2 (*CHARACTER DATA IS NOW IN LOCAL_DEST, RIGHT JUSTIFIED TO DESTSIZE-1*)
```

```
00000104  2  FIRST:=0;
000001C8  2  WHILE LOCAL_DEST[FIRST]=" " DO FIRST:=FIRST+1; (*FIND THE FIRST NON BLANK*)
000001E2  2  IF NEGATIVE THEN
000001EA  2    BEGIN (*FORMAT THE NEGITIVE SIGN*)
000001EA  2    FIRST:=FIRST-1;
000001EE  2    LOCAL_DEST[FIRST]:="-";
000001FC  2    END;  (*FORMAT THE NEGITIVE SIGN*)
000001FC  2  IF JUSTIFY=LEFT THEN
00000208  2    BEGIN (*LEFT JUSTIFY*)
00000208  2    FOR J:=FIRST TO DESTSIZE-1 DO
00000222  2      BEGIN
00000222  2      DEST^:=LOCAL_DEST[J];
00000232  2      DEST:=CHAR_PTR(INTEGER(DEST)+1);
0000023C  2      END;
0000024E  2    DESTSIZE:=DESTSIZE-FIRST;
00000258  2    END   (*LEFT JUSTIFY*)
0000025C  2    ELSE
0000025C  2    BEGIN (*RIGHT JUSTIFY*)
0000025C  2    FOR J:=0 TO DESTSIZE-1 DO
00000274  2      BEGIN
00000274  2      DEST^:=LOCAL_DEST[J];
00000284  2      DEST:=CHAR_PTR(INTEGER(DEST)+1);
0000028E  2      END;
000002A0  2    END;  (*RIGHT JUSTIFY*)
000002A0  2  END;
00000000  1  $GLOBPROC OFF$
00000000  1  .

End of compilation, number of errors=    0
```

```
                  "68000"
                  *
                  *  Tabs at 5, 15, 35
                  *
                      GLOBAL TRC_FILE_NAME
                      GLOBAL PRCSS_MSG_TBL
                  *
                  ****************************** PRCSS_ASYM ******************************
                  *  PRCSS_ASYM supplies the necessary ascii strings for all of the
                  *  Dynamic and Static Controller modules.  Module contains all message
                  *  strings, etc. required during loading/unloading/monitoring of the
                  *  hardware as well as those required during all emulation accesses.
                  *  PRCSS_ASYM is processor independent.
                  *  Author:  Kip Fulghum
                  *  Date:  9-21-82  Revised:  11-20-84
                  ***********************************************************************
                  *
                      DATA
000000            TRC_FILE_NAME
000000 6046           DC.W      6000H+"F"
000002 4F4F544443     ASC       "OOTDC "

000008            PRCSS_MSG_TBL
                  *
                  * Emulation semi-fatal error messages.
                  *
000008 0000042A       DC.L      NO_MSG              ; Message -35.
00000C 0000042A       DC.L      NO_MSG              ; Message -34.
000010 0000042A       DC.L      NO_MSG              ; Message -33.
000014 0000042A       DC.L      NO_MSG              ; Message -32
000018 000000E8       DC.L      NO_XFR_ADRS         ; Message -31.
00001C 00000118       DC.L      ILL_SW_BREAK        ; Message -30.
000020 0000013C       DC.L      CANT_GET_MON        ; Message -29.
000024 00000156       DC.L      NOT_IN_MONITOR      ; Message -28.
000028 00000170       DC.L      NO_MONITOR          ; Message -27.
00002C 00000184       DC.L      EMUL_PROBLEM        ; Message -26.
                  *
                  * Controller semi-fatal error messages.
                  *
000030 0000042A       DC.L      NO_MSG              ; Message -25.
000034 0000042A       DC.L      NO_MSG              ; Message -24.
000038 0000042A       DC.L      NO_MSG              ; Message -23.
00003C 0000042A       DC.L      NO_MSG              ; Message -22.
000040 0000042A       DC.L      NO_MSG              ; Message -21.
000044 0000042A       DC.L      NO_MSG              ; Message -20.
```

```
000048 000001A2          DC.L      VAR_NOT_FOUND       ; Message -19.
00004C 000001D0          DC.L      FRAME_UNDERFLOW     ; Message -18.
000050 00000202          DC.L      FRAME_OVERFLOW      ; Message -17.
000054 0000023E          DC.L      CANT_MAKE_FRAME     ; Message -16.
                     *
                     * Emulation/Controller fatal error messages.
                     *
000058 00000274          DC.L      UNIMP_MEAS          ; Message -15.
00005C 0000042A          DC.L      NO_MSG              ; Message -14.
000060 0000042A          DC.L      NO_MSG              ; Message -13.
000064 0000042A          DC.L      NO_MSG              ; Message -12.
000068 0000042A          DC.L      NO_MSG              ; Message -11.
00006C 0000042A          DC.L      NO_MSG              ; Message -10.
000070 0000042A          DC.L      NO_MSG              ; Message -9.
000074 00000290          DC.L      NO_DISABLE_SEQ      ; Message -8.
000078 000002C0          DC.L      OUT_OF_STATES       ; Message -7.
00007C 000002FS          DC.L      FUNC_OVERFLOW       ; Message -6.
000080 00000336          DC.L      OUT_OF_FSR          ; Message -5.
000084 00000368          DC.L      OUT_OF_H_RSRCS      ; Message -4.
000088 0000039C          DC.L      OUT_OF_L_RSRCS      ; Message -3.
00008C 000003D0          DC.L      CORRUPT_USER        ; Message -2.
000090 000003FC          DC.L      NOT_REAL_TIME       ; Message -1.
                     *
                     * No message.
                     *
000094 0000042A          DC.L      NO_MSG              ; Message 0.
                     *
                     * Controller status messages.
                     *
000098 0000042E          DC.L      LOADING             ; Message 1.
00009C 00000444          DC.L      WAITING             ; Message 2.
0000A0 0000047E          DC.L      RUNNING             ; Message 3.
0000A4 000004B8          DC.L      UNLOADING           ; Message 4.
0000A8 000004E6          DC.L      DONE                ; Message 5.
0000AC 0000042A          DC.L      NO_MSG              ; Message 6.
0000B0 0000042A          DC.L      NO_MSG              ; Message 7.
0000B4 0000042A          DC.L      NO_MSG              ; Message 8.
0000B8 0000042A          DC.L      NO_MSG              ; Message 9.
0000BC 0000042A          DC.L      NO_MSG              ; Message 10.
0000C0 0000042A          DC.L      NO_MSG              ; Message 11.
0000C4 00000524          DC.L      COMPLETED           ; Message 12.
0000C8 00000530          DC.L      HALTED              ; Message 13.
0000CC 0000053C          DC.L      REAL_TIME           ; Message 14.
0000D0 0000054C          DC.L      NON_REAL_TIME       ; Message 15.
                     *
                     * Controller footdc messages.
                     *
0000D4 0000055C          DC.L      NO_ENTRY_INFO       ; Message 16.
0000D8 000001D0          DC.L      FRAME_UNDERFLOW     ; Message 17.
0000DC 00000596          DC.L      WINDOW_CLOSED       ; Message 18.
0000E0 0000042A          DC.L      NO_MSG              ; Message 19.
0000E4 0000042A          DC.L      NO_MSG              ; Message 20.

0000E8               NO_XFR_ADRS
0000E8 0017              DC.W      23
0000EA 4E6F207472        ASC       "No transfer address - absolute file not loaded"
000118               ILL_SW_BREAK
000118 0011              DC.W      17
00011A 496C6C6567        ASC       "Illegal software break encountered"
00013C               CANT_GET_MON
00013C 000C              DC.W      12
00013E 556E61626C        ASC       "Unable to access monitor"
000156               NOT_IN_MONITOR
000156 000C              DC.W      12
000158 50726F6365        ASC       "Processor not in monitor"
000170               NO_MONITOR
000170 0009              DC.W      9
000172 4E6F206D6F        ASC       "No monitor program"
000184               EMUL_PROBLEM
000184 000E              DC.W      14
000186 456D756C61        ASC       "Emulation subsystem failure "
0001A2               VAR_NOT_FOUND
0001A2 0016              DC.W      22
0001A4 5661726961        ASC       "Variable access not allowed from current PC "
```

```
000180            FRAME_UNDERFLOW
000180 0018           DC.W     24
000182 4578697420     ASC      "Exit captured without matching entry information"
000202            FRAME_OVERFLOW
000202 001D           DC.W     29
000204 5265637572     ASC      "Recursive limit exceeded - additional levels not"
000234 2063617074     ASC      " captured "
00023E            CANT_MAKE_FRAME
00023E 001A           DC.W     26
000240 537461636B     ASC      "Stack information cannot be accessed from current PC"
000274            UNIMP_MEAS
000274 000D           DC.W     13
000276 556E696D70     ASC      "Unimplemented measurement "
000290            NO_DISABLE_SEQ
000290 001B           DC.W     27
000292 4F6E6C7920     ASC      "Only one disable sequence state allowed non-real-time "
0002C8            OUT_OF_STATES
0002C8 0017           DC.W     23
0002CA 4F7574206F     ASC      "Out of sequence states - simplify sequence(s) "
0002F8            FUNC_OVERFLOW
0002F8 001E           DC.W     30
0002FA 46756E6374     ASC      "Function description overflow - measurement too "
00032A 636F6D706C     ASC      "complicated "
000336            OUT_OF_FSR
000336 0018           DC.W     24
000338 4F7574206F     ASC      "Out of dynamic resources - simplify measurement "
000368            OUT_OF_H_RSRCS
000368 0019           DC.W     25
00036A 4F7574206F     ASC      "Out of high level resources - simplify measurement"
00039C            OUT_OF_L_RSRCS
00039C 0019           DC.W     25
00039E 4F7574206F     ASC      "Out of low level resources - simplify measurement "
0003D0            CORRUPT_USER
0003D0 0015           DC.W     21
0003D2 496E746572     ASC      "Internal measurement descriptor is corrupt"
0003FC            NOT_REAL_TIME
0003FC 0016           DC.W     22
0003FE 4D65617375     ASC      "Measurement cannot be accomplished real-time"
00042A            NO_MSG
00042A 0001           DC.W     1
00042C 2020           ASC      "  "
00042E            LOADING
00042E 000A           DC.W     10
000430 4C6F616469     ASC      "Loading the hardware"
000444            WAITING
000444 001C           DC.W     28
000446 4578656375     ASC      "Executing "
000450 2020202020     ASC      "             "   ; Words 6-12:  real/non-real-time.
00045E 2877616974     ASC      "(waiting for enable state # "
00047A 2020           ASC      "  "                ; Word 27:  enable state #.
00047C 2920           ASC      ") "
00047E            RUNNING
00047E 0014           DC.W     20                  ; Count:  10 = no state real-time
                  *                                ;         12 = no state non-real-time
                  *                                ;         21 = state, no saved
                  *                                ;         23 = state, saved
000480 4578656375     ASC      "Executing "
00048A 2020202020     ASC      "             "   ; Words 6-12:  real/non-real time
000498 2861637175     ASC      "(acquired = "
0004A4 20202020       ASC      "    "              , Words 19-20:  state count.
0004A8 2920           ASC      ") "                ; Word 21:  ") " or ", ".
0004AA 7361766564     ASC      "saved = "
0004B2 20202020       ASC      "    "              ; Words 26-27: saved count.
0004B6 2920           ASC      ") "
0004B8            UNLOADING
0004B8 0016           DC.W     22
0004BA 556E6C6F61     ASC      "Unloading acquisition memory (count = "
0004E0 20202020       ASC      "    "              ; Words 20-21:  unload count.
0004E4 2920           ASC      ") "
0004E6            DONE
0004E6 0012           DC.W     18                  ; Count:  18 = halted/completed
                  *                                ;         30 = disabled
0004E8 4578656375     ASC      "Execution "
0004F2 2020202020     ASC      "          "        ; Words 6-10:  halted/completed
```

```
0004FC 2028736176       ASC     " (saved = "
000506 20202020         ASC     "    "               ; Words 16-17:  unload count.
00050A 2920             ASC     ") "
00050C A020             DC.W    0A020H
00050E 20202020         ASC     "    "
000512 2080             DC.W    02080H
000514 4469736162       ASC     "Disable occurred"
000524                  COMPLETED
000524 0005             DC.W    5
000526 636F6D706C       ASC     "completed "
000530                  HALTED
000530 0005             DC.W    5
000532 68616C7465       ASC     "halted    "
00053C                  REAL_TIME
00053C 0007             DC.W    7
00053E 7265616C2D       ASC     "real-time      "
00054C                  NON_REAL_TIME
00054C 0007             DC.W    7
00054E 6E6F6E2D72       ASC     "non-real-time "
00055C                  NO_ENTRY_INFO
00055C 001C             DC.W    28
00055E 20204E6F20       ASC     "  No stack information - variable(s) cannot be displayed"
000596                  WINDOW_CLOSED
000596 001B             DC.W    27
000598 2020202020       ASC     "                -- Window disable occurred --"
                        END

Errors=    0

00000000  1  "68000" PREPROCESS
00000000  1  $EXTENSIONS ON$
00000000  1  $TITLE "Soda Dynamic Controller Front-end Translator"
00000000  1  PROGRAM TRANS_UTLS;
00000000  1  (*
00000000  1  ****************************** TRANS_UTLS ******************************
00000000  1    Module TRANS_UTLS contains the front-end for the measurement pre-
00000000  1    processors and the measurement post-processors.  There are two basic
00000000  1    routines, one for pre-processing and one for post-processing.  Both
00000000  1    routines do the same thing:  determine what type of measurement/
00000000  1    specification is involved, then call the appropriate pre/post
00000000  1    processor(s).  TRANS_UTLS is processor independent.
00000000  1    Author:  Kip Fulghum
00000000  1    Date:  11-10-82  Revised:  11-20-84
00000000  1  ************************************************************************
00000000  1
00000000  1    TRANS_UTLS contains the following routines:
00000000  1    -Global procedure TRANS_MEAS_IN is the front-end to the measurement
00000000  1     pre-processors.  It calls the appropriate pre-processor(s) based on
00000000  1     what type of measurement is involved.
00000000  1    -Global procedure TRANS_SPEC_OUT is the front-end to the measurement
00000000  1     post-processors.  It calls the appropriate post-processor based on
00000000  1     what type of specification is to be unloaded.
00000000  1
00000000  1    In addition, the following external routines are used:
00000000  1    START_SPEC, SET_SPEC, FIND_MEAS, SET_FEATURE, TEST_FEATURE,
00000000  1    and all the pre and post processors - LOAD_SS, UNLOAD_SS,
00000000  1    LOAD_TV, UNLOAD_TV, LOAD_TS, UNLOAD_TS, LOAD_TSR, UNLOAD_TSR,
00000000  1    LOAD_TM, UNLOAD_TM, LOAD_TD, UNLOAD_TD, LOAD_TX, UNLOAD_TX,
00000000  1    LOAD_TB, UNLOAD_TB, LOAD DM, UNLOAD DM, LOAD CS, UNLOAD CS,
00000000  1    LOAD_TMA, UNLOAD_TMA.
00000000  1                                                                     *)
00000000  1  (*
00000000  1                            **************************
00000000  1                            ***** Include Files *****
00000000  1                            **************************
00000000  1                                                                     *)
00000000  1
00000000  1  #INCLUDE DEBUG_CONST:SS_DYN
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
```

```
00000000  1  #INCLUDE ICMD_DATA:SODAMON
00000000  1
00000000  1  #INCLUDE TRANS_TYPES:SS_DYN
00000000  1
00000000  1  VAR
00000000  1
00000000  1  $EXTVAR ONS
00000000  1
00000000  1    DEBUG_FLAG:  S_INT; (* Flag for debug options *)
00000000  1
00000000  1  $EXTVAR OFFS
00000000  1
00000000  1
00000000  1
00000000  1
00000000  1
00000000  1  $CALL_ABS_LONGS
00000000  1  (*
00000000  1                          ***********************
00000000  1                          ***** START_SPEC *****
00000000  1                          ***********************
00000000  1                                                                        *)
00000000  1  PROCEDURE START_SPEC ( PRI:  S_INT; TIME, BREAK:  BOOLEAN; VAR SPEC_PTR:
00000000  2                          TRACE_SPEC_PTR ); EXTERNAL;
00000000  1  (*
00000000  1    Procedure START_SPEC to allocate and prepare a trace spec for use.
00000000  1    Provided as a Pascal external.
00000000  1                                                                        *)
00000000  1
00000000  1
00000000  1
00000000  1
00000000  1
00000000  1  (*
00000000  1                          *********************
00000000  1                          ***** SET_SPEC *****
00000000  1                          *********************
00000000  1                                                                        *)
00000000  1  PROCEDURE SET_SPEC ( PRI:  S_INT; SET_STATUS:  SPEC_STATUS ); EXTERNAL;
00000000  1  (*
00000000  1    Procedure SET_SPEC to set the status of a trace specification.
00000000  1    Provided as a Pascal external.
00000000  1                                                                        *)
00000000  1
00000000  1
00000000  1
00000000  1
00000000  1
00000000  1  (*
00000000  1                          **********************
00000000  1                          ***** FIND_MEAS *****
00000000  1                          **********************
00000000  1                                                                        *)
00000000  1  FUNCTION FIND_MEAS ( VAR MEAS_STRUCT:  CMD_DATA_ARRAY ):  S_INT;
00000002  2                          EXTERNAL;
00000000  1  (*
00000000  1    Function FIND_MEAS to return the index of the record in the user
00000000  1    measurement structure describing the type of measurement.  Provided
00000000  1    as a Pascal external.
00000000  1                                                                        *)
00000000  1
00000000  1
00000000  1
00000000  1
00000000  1
00000000  1  (*
00000000  1                          ************************
00000000  1                          ***** SET_FEATURE *****
00000000  1                          ************************
00000000  1                                                                        *)
00000000  1  PROCEDURE SET_FEATURE ( ON_OFF:  CONDITION_TYPE; VAR FEAT_SIG:
00000000  2                          FEATURE_REC ); EXTERNAL;
00000000  1  (*
00000000  1    Procedure SET_FEATURE to turn on/off a feature signal.  Provided as
00000000  1    a Pascal external.
```

```
00000000 1                                                        *)
00000000 1
00000000 1
00000000 1
00000000 1
00000000 1
00000000 1 (*
00000000 1                         ************************
00000000 1                         ***** TEST_FEATURE *****
00000000 1                         ************************
00000000 1                                                        *)
00000000 1 FUNCTION TEST_FEATURE ( VAR FEAT_SIG:  FEATURE_REC ): CONDITION_TYPE,
00000001 2                         EXTERNAL;
00000000 1 (*
00000000 1   Function TEST_FEATURE to test to see if a given feature is turned
00000000 1   on or not.  Provided as a Pascal external.
00000000 1                                                        *)
00000000 1
00000000 1
00000000 1
00000000 1
00000000 1
00000000 1 $CALL_PC_SHORTS
00000000 1 (*
00000000 1                           *******************
00000000 1                           ***** LOAD_SS *****
00000000 1                           *******************
00000000 1                                                        *)
00000000 1 PROCEDURE LOAD_SS ( VAR TOTAL_MEAS_:  TOTAL_MEAS_REC; HEAD_PTR:
00000000 2                     TRACE_SPEC_PTR; VAR R_CODE:  S_INT ); EXTERNAL;
00000000 1 (*
00000000 1   Procedure LOAD_SS to serve as the pre-processor for the start/
00000000 1   sequence/stop specification.  Provided as a Pascal external.
00000000 1                                                        *)
00000000 1
00000000 1
00000000 1
00000000 1
00000000 1
00000000 1 (*
00000000 1                          *********************
00000000 1                          ***** UNLOAD_SS *****
00000000 1                          *********************
00000000 1                                                        *)
00000000 1 PROCEDURE UNLOAD_SS ( VAR TOTAL_MEAS_:  TOTAL_MEAS_REC; VAR SYMS_:
00000000 2                       SYM_DESCRIPS; VAR FLAGS_:  FLAG_ARRAY_TYPE; MAC_:
00000000 2                       S_INT; VAR SPEC_:  HW_SPEC_REC; VAR UNLD_COUNT,
00000000 2                       R_CODE:  S_INT ); EXTERNAL;
00000000 1 (*
00000000 1   Procedure UNLOAD_SS to serve as the post-processor for the start/
00000000 1   sequence/stop specification.  Provided as a Pascal external.
00000000 1                                                        *)
00000000 1
00000000 1
00000000 1
00000000 1
00000000 1
00000000 1 (*
00000000 1                           *******************
00000000 1                           ***** LOAD_TV *****
00000000 1                           *******************
00000000 1                                                        *)
00000000 1 PROCEDURE LOAD_TV ( VAR MEAS_:  CMD_DATA_ARRAY; VAR SYMS_:
00000000 2                     SYM_DESCRIPS; VAR SPEC_:  HW_SPEC_REC; VAR R_CODE:
00000000 2                     S_INT ); EXTERNAL;
00000000 1 (*
00000000 1   Procedure LOAD_TV to serve as the pre-processor for the trace
00000000 1   variables measurement.  Provided as a Pascal external.
00000000 1                                                        *)
00000000 1
00000000 1
00000000 1
00000000 1
00000000 1
00000000 1 (*
```

```
00000000  1                      *********************
00000000  1                      ***** UNLOAD_TV *****
00000000  1                      *********************
00000000  1                                                              *)
00000000  1  PROCEDURE UNLOAD_TV ( VAR MEAS_:  CMD_DATA_ARRAY; VAR SYMS_:
00000000  2                     SYM_DESCRIPS; VAR FLAGS_:  FLAG_ARRAY_TYPE; MAC_:
00000000  2                     S_INT; VAR SPEC_:  HW_SPEC_REC; VAR UNLD_COUNT,
00000000  2                     R_CODE:  S_INT ); EXTERNAL;
00000000  1  (*
00000000  1   Procedure UNLOAD_TV to serve as the post-processor for the trace
00000000  1   variables measurement.  Provided as a Pascal external.
00000000  1                                                              *)
00000000  1
00000000  1
00000000  1
00000000  1
00000000  1
00000000  1  (*
00000000  1                      ********************
00000000  1                      ***** LOAD_TS *****
00000000  1                      ********************
00000000  1                                                              *)
00000000  1  PROCEDURE LOAD_TS ( VAR MEAS_:  CMD_DATA_ARRAY; VAR SYMS_:
00000000  2                    SYM_DESCRIPS; VAR SPEC_:  HW_SPEC_REC; VAR R_CODE:
00000000  2                    S_INT ); EXTERNAL;
00000000  1  (*
00000000  1   Procedure LOAD_TS to serve as the pre-processor for the trace
00000000  1   statements measurement.  Provided as a Pascal external.
00000000  1                                                              *)
00000000  1
00000000  1
00000000  1
00000000  1
00000000  1
00000000  1  (*
00000000  1                      *********************
00000000  1                      ***** UNLOAD_TS *****
00000000  1                      *********************
00000000  1                                                              *)
00000000  1  PROCEDURE UNLOAD_TS ( VAR MEAS_:  CMD_DATA_ARRAY; VAR SYMS_:
00000000  2                     SYM_DESCRIPS; VAR FLAGS_:  FLAG_ARRAY_TYPE; MAC_:
00000000  2                     S_INT; VAR SPEC_:  HW_SPEC_REC; VAR UNLD_COUNT,
00000000  2                     R_CODE:  S_INT ); EXTERNAL;
00000000  1  (*
00000000  1   Procedure UNLOAD_TS to serve as the post-processor for the trace
00000000  1   statements measurement.  Provided as a Pascal external.
00000000  1                                                              *)
00000000  1
00000000  1
00000000  1
00000000  1
00000000  1
00000000  1  (*
00000000  1                      *********************
00000000  1                      ***** LOAD_TSR *****
00000000  1                      *********************
00000000  1                                                              *)
00000000  1  PROCEDURE LOAD_TSR ( VAR MEAS_:  CMD_DATA_ARRAY; VAR SYMS_:
00000000  2                    SYM_DESCRIPS; VAR SPEC_:  HW_SPEC_REC; VAR R_CODE:
00000000  2                    S_INT ); EXTERNAL;
00000000  1  (*
00000000  1   Procedure LOAD_TSR to serve as the pre-processor for the real-time
00000000  1   trace statements measurement.  Provided as a Pascal external.
00000000  1                                                              *)
00000000  1
00000000  1
00000000  1
00000000  1
00000000  1
00000000  1  (*
00000000  1                      **********************
00000000  1                      ***** UNLOAD_TSR *****
00000000  1                      **********************
00000000  1                                                              *)
00000000  1  PROCEDURE UNLOAD_TSR ( VAR MEAS_:  CMD_DATA_ARRAY; VAR SYMS_:
```

```
00000000 2                      SYM_DESCRIPS; VAR FLAGS_:  FLAG_ARRAY_TYPE; MAC_:
00000000 2                      S_INT; VAR SPEC_:  HW_SPEC_REC; VAR UNLD_COUNT,
00000000 2                      R_CODE:  S_INT ); EXTERNAL;
00000000 1  (*
00000000 1   Procedure UNLOAD_TSR to serve as the post-processor for the real-time
00000000 1   trace statements measurement.  Provided as a Pascal external.
00000000 1                                                                     *)
00000000 1
00000000 1
00000000 1
00000000 1
00000000 1
00000000 1  (*
00000000 1                            *******************
00000000 1                            ***** LOAD_TM *****
00000000 1                            *******************
00000000 1                                                                     *)
00000000 1  PROCEDURE LOAD_TM ( VAR MEAS_:  CMD_DATA_ARRAY; VAR SYMS_:
00000000 2                    SYM_DESCRIPS; VAR SPEC_:  HW_SPEC_REC; VAR R_CODE:
00000000 2                    S_INT ); EXTERNAL;
00000000 1  (*
00000000 1   Procedure LOAD_TM to serve as the pre-processor for the trace
00000000 1   modules measurement.  Provided as a Pascal external.
00000000 1                                                                     *)
00000000 1
00000000 1
00000000 1
00000000 1
00000000 1
00000000 1  (*
00000000 1                            *********************
00000000 1                            ***** UNLOAD_TM *****
00000000 1                            *********************
00000000 1                                                                     *)
00000000 1  PROCEDURE UNLOAD_TM ( VAR MEAS_:  CMD_DATA_ARRAY; VAR SYMS_:
00000000 2                      SYM_DESCRIPS; VAR FLAGS_:  FLAG_ARRAY_TYPE; MAC_:
00000000 2                      S_INT; VAR SPEC_:  HW_SPEC_REC; VAR UNLD_COUNT,
00000000 2                      R_CODE:  S_INT ); EXTERNAL;
00000000 1  (*
00000000 1   Procedure UNLOAD_TM to serve as the post-processor for the trace
00000000 1   modules measurement.  Provided as a Pascal external.
00000000 1                                                                     *)
00000000 1
00000000 1
00000000 1
00000000 1
00000000 1
00000000 1  (*
00000000 1                            *******************
00000000 1                            ***** LOAD_TD *****
00000000 1                            *******************
00000000 1                                                                     *)
00000000 1  PROCEDURE LOAD_TD ( VAR MEAS_:  CMD_DATA_ARRAY; VAR SYMS_:
00000000 2                    SYM_DESCRIPS; VAR SPEC_:  HW_SPEC_REC; VAR R_CODE:
00000000 2                    S_INT ); EXTERNAL;
00000000 1  (*
00000000 1   Procedure LOAD_TD to serve as the pre-processor for the trace
00000000 1   data flow measurement.  Provided as a Pascal external.
00000000 1                                                                     *)
00000000 1
00000000 1
00000000 1
00000000 1
00000000 1
00000000 1  (*
00000000 1                            *********************
00000000 1                            ***** UNLOAD_TD *****
00000000 1                            *********************
00000000 1                                                                     *)
00000000 1  PROCEDURE UNLOAD_TD ( VAR MEAS_:  CMD_DATA_ARRAY; VAR SYMS_:
00000000 2                      SYM_DESCRIPS; VAR FLAGS_:  FLAG_ARRAY_TYPE; MAC_:
00000000 2                      S_INT; VAR SPEC_:  HW_SPEC_REC; VAR UNLD_COUNT,
00000000 2                      R_CODE:  S_INT ); EXTERNAL;
00000000 1  (*
00000000 1   Procedure UNLOAD_TD to serve as the post-processor for the trace
```

```
00000000 1    data flow measurement.  Provided as a Pascal external.
00000000 1                                                              *)
00000000 1
00000000 1
00000000 1
00000000 1
00000000 1
00000000 1  (*
00000000 1                          *******************
00000000 1                          ***** LOAD_TX *****
00000000 1                          *******************
00000000 1                                                              *)
00000000 1  PROCEDURE LOAD_TX ( VAR MEAS_:  CMD_DATA_ARRAY; VAR SYMS_:
00000000 2                      SYM_DESCRIPS; VAR SPEC_:  HW_SPEC_REC; VAR R_CODE:
00000000 2                      S_INT ); EXTERNAL;
00000000 1  (*
00000000 1    Procedure LOAD_TX to serve as the pre-processor for the trace
00000000 1    don't care measurement.  Provided as a Pascal external.
00000000 1                                                              *)
00000000 1
00000000 1
00000000 1
00000000 1
00000000 1
00000000 1  (*
00000000 1                          *********************
00000000 1                          ***** UNLOAD_TX *****
00000000 1                          *********************
00000000 1                                                              *)
00000000 1  PROCEDURE UNLOAD_TX ( VAR MEAS_:  CMD_DATA_ARRAY; VAR SYMS_:
00000000 2                        SYM_DESCRIPS; VAR FLAGS_:  FLAG_ARRAY_TYPE; MAC_:
00000000 2                        S_INT; VAR SPEC_:  HW_SPEC_REC; VAR UNLD_COUNT,
00000000 2                        R_CODE:  S_INT ); EXTERNAL;
00000000 1  (*
00000000 1    Procedure UNLOAD_TX to serve as the post-processor for the trace
00000000 1    don't care measurement.  Provided as a Pascal external.
00000000 1                                                              *)
00000000 1
00000000 1
00000000 1
00000000 1
00000000 1
00000000 1  (*
00000000 1                          *******************
00000000 1                          ***** LOAD_TB *****
00000000 1                          *******************
00000000 1                                                              *)
00000000 1  PROCEDURE LOAD_TB ( VAR MEAS_:  CMD_DATA_ARRAY; VAR SYMS_:
00000000 2                      SYM_DESCRIPS; VAR SPEC_:  HW_SPEC_REC; VAR R_CODE:
00000000 2                      S_INT ); EXTERNAL;
00000000 1  (*
00000000 1    Procedure LOAD_TB to serve as the pre-processor for the trace
00000000 1    break measurement.  Provided as a Pascal external.
00000000 1                                                              *)
00000000 1
00000000 1
00000000 1
00000000 1
00000000 1
00000000 1  (*
00000000 1                          *********************
00000000 1                          ***** UNLOAD_TB *****
00000000 1                          *********************
00000000 1                                                              *)
00000000 1  PROCEDURE UNLOAD_TB ( VAR MEAS_:  CMD_DATA_ARRAY; VAR SYMS_:
00000000 2                        SYM_DESCRIPS; VAR FLAGS_:  FLAG_ARRAY_TYPE; MAC_:
00000000 2                        S_INT; VAR SPEC_:  HW_SPEC_REC; VAR UNLD_COUNT,
00000000 2                        R_CODE:  S_INT ); EXTERNAL;
00000000 1  (*
00000000 1    Procedure UNLOAD_TB to serve as the post-processor for the trace
00000000 1    break measurement.  Provided as a Pascal external.
00000000 1                                                              *)
00000000 1
00000000 1
00000000 1
```

```
00000000 1
00000000 1
00000000 1
00000000 1 (*
00000000 1                     ********************
00000000 1                     ***** LOAD_DM *****
00000000 1                     ********************
00000000 1                                                        *)
00000000 1 PROCEDURE LOAD_DM ( VAR MEAS_:  CMD_DATA_ARRAY; VAR SYMS_:
00000000 2                     SYM_DESCRIPS; VAR SPEC_:  HW_SPEC_REC; VAR R_CODE:
00000000 2                     S_INT ); EXTERNAL;
00000000 1 (*
00000000 1   Procedure LOAD_DM to serve as the pre-processor for the time
00000000 1   modules measurement.  Provided as a Pascal external.
00000000 1                                                        *)
00000000 1
00000000 1
00000000 1
00000000 1
00000000 1
00000000 1 (*
00000000 1                     **********************
00000000 1                     ***** UNLOAD_DM *****
00000000 1                     **********************
00000000 1                                                        *)
00000000 1 PROCEDURE UNLOAD_DM ( VAR MEAS_:  CMD_DATA_ARRAY; VAR SYMS_:
00000000 2                     SYM_DESCRIPS; VAR FLAGS_:  FLAG_ARRAY_TYPE; MAC_:
00000000 2                     S_INT; VAR SPEC_:  HW_SPEC_REC; VAR UNLD_COUNT,
00000000 2                     R_CODE:  S_INT ); EXTERNAL;
00000000 1 (*
00000000 1   Procedure UNLOAD_DM to serve as the post-processor for the time
00000000 1   modules measurement.  Provided as a Pascal external.
00000000 1                                                        *)
00000000 1
00000000 1
00000000 1
00000000 1
00000000 1
00000000 1 (*
00000000 1                     ********************
00000000 1                     ***** LOAD_CS *****
00000000 1                     ********************
00000000 1                                                        *)
00000000 1 PROCEDURE LOAD_CS ( VAR MEAS_:  CMD_DATA_ARRAY; VAR SYMS_:
00000000 2                     SYM_DESCRIPS; VAR SPEC_:  HW_SPEC_REC; VAR R_CODE:
00000000 2                     S_INT ); EXTERNAL;
00000000 1 (*
00000000 1   Procedure LOAD_CS to serve as the pre-processor for the count
00000000 1   statements measurement.  Provided as a Pascal external.
00000000 1                                                        *)
00000000 1
00000000 1
00000000 1
00000000 1
00000000 1
00000000 1 (*
00000000 1                     **********************
00000000 1                     ***** UNLOAD_CS *****
00000000 1                     **********************
00000000 1                                                        *)
00000000 1 PROCEDURE UNLOAD_CS ( VAR MEAS_:  CMD_DATA_ARRAY; VAR SYMS_:
00000000 2                     SYM_DESCRIPS; VAR FLAGS_:  FLAG_ARRAY_TYPE; MAC_:
00000000 2                     S_INT; VAR SPEC_:  HW_SPEC_REC; VAR UNLD_COUNT,
00000000 2                     R_CODE:  S_INT ); EXTERNAL;
00000000 1 (*
00000000 1   Procedure UNLOAD_CS to serve as the post-processor for the count
00000000 1   statements measurement.  Provided as a Pascal external.
00000000 1                                                        *)
00000000 1
00000000 1
00000000 1
00000000 1
00000000 1
00000000 1 (*
```

```
00000000  1                          *********************
00000000  1                          ***** LOAD_TMA *****
00000000  1                          *********************
00000000  1                                                                   *)
00000000  1  PROCEDURE LOAD_TMA ( VAR MEAS_:  CMD_DATA_ARRAY; VAR SYMS_:
00000000  2                  SYM_DESCRIPS; VAR SPEC_:  HW_SPEC_REC; VAR R_CODE:
00000000  2                  S_INT ); EXTERNAL;
00000000  1  (*
00000000  1    Procedure LOAD_TMA to serve as the pre-processor for the trace
00000000  1    modules all measurement.  Provided as a Pascal external.
00000000  1                                                                   *)
00000000  1
00000000  1
00000000  1
00000000  1
00000000  1
00000000  1  (*
00000000  1                          ***********************
00000000  1                          ***** UNLOAD_TMA *****
00000000  1                          ***********************
00000000  1                                                                   *)
00000000  1  PROCEDURE UNLOAD_TMA ( VAR MEAS_:  CMD_DATA_ARRAY; VAR SYMS_:
00000000  2                  SYM_DESCRIPS; VAR FLAGS_:  FLAG_ARRAY_TYPE; MAC_:
00000000  2                  S_INT; VAR SPEC_:  HW_SPEC_REC; VAR UNLD_COUNT,
00000000  2                  R_CODE:  S_INT ); EXTERNAL;
00000000  1  (*
00000000  1    Procedure UNLOAD_TMA to serve as the post-processor for the trace
00000000  1    modules all measurement.  Provided as a Pascal external.
00000000  1                                                                   *)
00000000  1
00000000  1
00000000  1
00000000  1
00000000  1
00000000  1  (*
00000000  1                        **************************
00000000  1                        ***** TRANS_MEAS_IN *****
00000000  1                        **************************
00000000  1                                                                   *)
00000000  1  $GLOBPROC ON$
00000000  1  PROCEDURE TRANS_MEAS_IN ( VAR TOTAL_MEAS:  TOTAL_MEAS_REC; VAR
00000000  2                  SYM_STRUCT:  SYM_DESCRIPS; VAR HEAD_PTR:
00000000  2                  TRACE_SPEC_PTR; VAR RET_CODE:  S_INT );
00000000  2  (*
00000000  2    Procedure TRANS_MEAS_IN to determine what type of measurement is to
00000000  2    be run. then initiate the translation of the measurement description
00000000  2    into an equivalent hardware description.
00000000  2
00000000  2    TRANS_MEAS_IN uses the following routines:  START_SPEC, FIND_MEAS,
00000000  2    SET_FEATURE, TEST_FEATURE,
00000000  2    and all the pre-processors - LOAD_SS, LOAD_TU, LOAD_TS, LOAD_TSR,
00000000  2    LOAD_TM. LOAD_TD, LOAD_TX, LOAD_TB, LOAD_DM, LOAD_CS, LOAD_TMA.
00000000  2
00000000  2    Input:  1) TOTAL_MEAS, a structure of pointers to structures
00000000  2               containing all measurement data, ie enables, disables,
00000000  2               configuration, command, and the measurement itself
00000000  2            2) SYM_STRUCT, a record indicating all unique symbols that
00000000  2               are to be traced ( from MEAS_PTR^ )
00000000  2    Output:  1) HEAD_PTR, a pointer to the head of a list of trace
00000000  2                specifications describing the measurement to be made
00000000  2             2) RET_CODE, a code specifying how the load turned out:
00000000  2                 -15 indicates unimplemented measurement:  translation
00000000  2                       cannot be accomplished
00000000  2                  -8 indicates disable sequence not allowed
00000000  2                  -7 indicates out of sequence states
00000000  2                  -6 indicates translation error:  function
00000000  2                       description overflow
00000000  2                  -5 indicates out of fast sequencer resources
00000000  2                  -4 indicates out of high level hardware resources
00000000  2                  -3 indicates out of low level hardware resources
00000000  2                  -2 indicates measurement structure is corrupt
00000000  2                  -1 indicates measurement was requested to be real-time,
00000000  2                       but it cannot be done in real-time
00000000  2                   0 indicates no error:  translation completed
```

```
00000000  2                                                          *)
00000000  2  VAR
00000000  2
00000000  2    MSRMNT_INDEX:  S_INT; (* Index into measurement description structure
00000002  2                             of measurement type record *)
00000002  2
00000002  2    MEAS_SPEC:  TRACE_SPEC_PTR; (* Measurement trace spec being built *)
00000006  2
00000006  2    MSRMNT:  OP_CODES; (* Type of measurement *)
00000004  2
00000004  2  BEGIN (* Procedure TRANS_MEAS_IN *)
00000004  2    RET_CODE := NO_ERROR; (* Go for the glory *)
0000000A  2
0000000A  2    (* Get the type of measurement *)
0000000A  2
0000000A  2    MSRMNT_INDEX := FIND_MEAS ( TOTAL_MEAS.MEAS_PTR^ );
00000020  2    IF MSRMNT_INDEX < 0
00000028  2      THEN (* Problems:  structure is corrupt *)
00000028  2        RET_CODE := CORRUPT_USER
00000034  2      ELSE (* All is well *)
00000034  2        BEGIN (* Build the measurement *)
00000034  2
00000034  2          (* Set up an initial measurement spec and insert at head of
00000034  2             the list *)
00000034  2
00000034  2          (* Don't set break on measurement complete yet! *)
00000034  2          START_SPEC ( 16, TOTAL_MEAS.CONFIG_PTR^.COUNT_TIME, FALSE,
00000034  2                       MEAS_SPEC );
00000056  2          HEAD_PTR := MEAS_SPEC;
0000005E  2
0000005E  2          (* Now, set up measurement dependent stuff *)
0000005E  2
0000005E  2          MSRMNT := TOTAL_MEAS.MEAS_PTR^ [ MSRMNT_INDEX ].OP_CODE;
00000074  2          CASE MSRMNT OF
0000007E  2            TR_VAR:  (* Trace variables *)
0000007E  2              BEGIN (* Create a trace variables specification *)
0000007E  2                MEAS_SPEC^.UM_REQUEST := UM_TRACE_VAR;
00000088  2                LOAD_TV ( TOTAL_MEAS.MEAS_PTR^, SYM_STRUCT, MEAS_SPEC^.
00000088  2                          HW_SPEC, RET_CODE )
000000B0  2              END; (* Create a trace variables specification *)
000000B4  2            TR_STA:  (* Trace statements *)
000000B4  2              IF TOTAL_MEAS.CONFIG_PTR^.REAL_TIME = TRUE
000000C8  2                THEN (* Want a real-time trace statements *)
000000C8  2                  BEGIN (* Create a real-time trace statements spec *)
000000C8  2                    MEAS_SPEC^.UM_REQUEST := UM_TRACE_RSTAT;
000000D2  2                    LOAD_TSR ( TOTAL_MEAS.MEAS_PTR^, SYM_STRUCT,
000000D2  2                               MEAS_SPEC^.HW_SPEC, RET_CODE )
000000FA  2                  END (* Create a real-time trace statements spec *)
000000FE  2                ELSE (* Use non-real-time trace statements *)
000000FE  2                  BEGIN (* Create a non-real-time trace statements spec *)
000000FE  2                    MEAS_SPEC^.UM_REQUEST := UM_TRACE_STAT;
00000108  2                    LOAD_TS ( TOTAL_MEAS.MEAS_PTR^, SYM_STRUCT,
00000108  2                              MEAS_SPEC^.HW_SPEC, RET_CODE )
00000130  2                  END; (* Create a non-real-time trace statements spec *)
00000134  2            TR_MOD:  (* Trace modules *)
00000134  2              IF DEBUG_FLAG = DEBUG_TRACEMOD
00000140  2                THEN (* Want a trace modules specific *)
00000140  2                  BEGIN (* Create a trace modules specific spec *)
00000140  2                    MEAS_SPEC^.UM_REQUEST := UM_TRACE_MODS;
0000014A  2                    LOAD_TM ( TOTAL_MEAS.MEAS_PTR^, SYM_STRUCT,
0000014A  2                              MEAS_SPEC^.HW_SPEC, RET_CODE )
00000172  2                  END (* Create a trace modules specific spec *)
00000176  2                ELSE (* Use trace modules all *)
00000176  2                  BEGIN (* Create a trace modules all spec *)
00000176  2                    MEAS_SPEC^.UM_REQUEST := UM_TRACE_AMODS;
00000180  2                    LOAD_TMA ( TOTAL_MEAS.MEAS_PTR^, SYM_STRUCT,
00000180  2                               MEAS_SPEC^.HW_SPEC, RET_CODE )
000001A8  2                  END; (* Create a trace modules all spec *)
000001AC  2            TR_DAT:  (* Trace data flow *)
000001AC  2              BEGIN (* Create a trace data flow specification *)
000001AC  2                MEAS_SPEC^.UM_REQUEST := UM_TRACE_DATA;
000001B6  2                LOAD_TD ( TOTAL_MEAS.MEAS_PTR^, SYM_STRUCT, MEAS_SPEC^.
000001B6  2                          HW_SPEC, RET_CODE )
000001DE  2              END; (* Create a trace data flow specification *)
```

```
000001E2  2            TR_XXX:  (* Trace don't care *)
000001E2  2              BEGIN (* Create a don't care trace specification *)
000001E2  2                MEAS_SPEC^.UN_REQUEST := UN_TRACE_XXX;
000001EC  2                LOAD_TX ( TOTAL_MEAS.MEAS_PTR^, SYM_STRUCT, MEAS_SPEC^.
000001EC  2                          HW_SPEC, RET_CODE )
00000214  2              END; (* Create a don't care trace specification *)
00000218  2            BRK_ON:  (* Break on measurement *)
00000218  2              BEGIN (* Create a trace break specification *)
00000218  2                MEAS_SPEC^.UN_REQUEST := UN_TRACE_BRK;
00000222  2                LOAD_TB ( TOTAL_MEAS.MEAS_PTR^, SYM_STRUCT, MEAS_SPEC^.
00000222  2                          HW_SPEC, RET_CODE )
0000024A  2              END; (* Create a trace break specification *)
0000024E  2            TI_MOD:  (* Time modules *)
0000024E  2              BEGIN (* Create a duration modules specification *)
0000024E  2                MEAS_SPEC^.UN_REQUEST := UN_TIME_MODS;
00000258  2                LOAD_DM ( TOTAL_MEAS.MEAS_PTR^, SYM_STRUCT, MEAS_SPEC^.
00000258  2                          HW_SPEC, RET_CODE )
00000280  2              END; (* Create a duration modules specification *)
00000284  2            CT_STA:  (* Count statements *)
00000284  2              BEGIN (* Create a count statements specification *)
00000284  2                MEAS_SPEC^.UN_REQUEST := UN_COUNT_STAT;
0000028E  2                LOAD_CS ( TOTAL_MEAS.MEAS_PTR^, SYM_STRUCT, MEAS_SPEC^.
0000028E  2                          HW_SPEC, RET_CODE )
000002B6  2              END; (* Create a count statements specification *)
000002BA  2            OTHERWISE (* Unimplemented measurement *)
000002BA  2              RET_CODE := UNIMP_MEAS
000002C2  2          END (* Of case statement *)
000002FA  2        END; (* Build the measurement *)
000002FA  2
000002FA  2    (* Add start/sequence/stop specification *)
000002FA  2
000002FA  2    IF RET_CODE = NO_ERROR
00000304  2      THEN (* Measurement built *)
00000304  2        LOAD_SS ( TOTAL_MEAS, HEAD_PTR, RET_CODE );
00000320  2
00000320  2    IF RET_CODE = NO_ERROR
0000032A  2      THEN (* Check to see if measurement is real-time or not:  can tell
0000032A  2              by making sure emulation break is not enabled in 1st spec *)
0000032A  2        IF ( TEST_FEATURE ( HEAD_PTR^.HW_SPEC.FEATURES [ BREAK_ON_STOP ] )
0000032A  2          = ON ) AND ( MSRMNT <> BRK_ON ) AND
0000032A  2          ( TOTAL_MEAS.CONFIG_PTR^.REAL_TIME = TRUE )
00000374  2          THEN (* Implicit breaks in measurement and real-time required *)
00000374  2            RET_CODE := NOT_REAL_TIME
00000380  2          ELSE (* Real-time not a problem *)
00000380  2            (* Now set up break on measurement complete *)
00000380  2            IF TOTAL_MEAS.CONFIG_PTR^.BREAK_MEAS_COMP = TRUE
00000394  2              THEN (* User wants break on measurement complete *)
00000394  2                SET_FEATURE ( ON, HEAD_PTR^.HW_SPEC.FEATURES
00000394  2                              [ BREAK_ON_STOP ] )
000003AC  2 END; (* Procedure TRANS_MEAS_IN *)
00000000  1 $GLOBPROC OFF$
00000000  1
00000000  1
00000000  1
00000000  1
00000000  1
00000000  1 (*
00000000  1                      ***************************
00000000  1                      ***** TRANS_SPEC_OUT *****
00000000  1                      ***************************
00000000  1                                                              *)
00000000  1 $GLOBPROC ON$
00000000  1 PROCEDURE TRANS_SPEC_OUT ( VAR TOTAL_MEAS:  TOTAL_MEAS_REC; VAR
00000000  2                       SYM_STRUCT:  SYM_DESCRIPS; VAR FLS_ARRAY:
00000000  2                       FLAG_ARRAY_TYPE; MAC:  S_INT; VAR TRACE_SPEC:
00000000  2                       TRACE_SPEC_REC; VAR UNLOAD_COUNTER, RET_CODE:
00000000  2                       S_INT );
000003B4  2 (*
000003B4  2   Procedure TRANS_SPEC_OUT to initiate the actual unloading of the
000003B4  2   hardware.  It determines what type of specification was run, then
000003B4  2   initiates the appropriate specification post-processor to unload the
000003B4  2   hardware, to do any necessary garbage filtering, and to create valid
000003B4  2   trace file data records from the hardware data.
000003B4  2
```

```
000003B4  2    TRANS_SPEC_OUT uses the following routines:  SET_SPEC,
000003B4  2    and all the post-processors - UNLOAD_SS, UNLOAD_TV, UNLOAD_TS,
000003B4  2    UNLOAD_TSR, UNLOAD_TM, UNLOAD_TD, UNLOAD_TX, UNLOAD_TB, UNLOAD_DM,
000003B4  2    UNLOAD_CS, UNLOAD_TMA.
000003B4  2
000003B4  2    Input:  1) TOTAL_MEAS, a structure of pointers to structures
000003B4  2               containing all measurement data, ie enables, disables,
000003B4  2               configuration, command, and the measurement itself
000003B4  2            2) SYM_STRUCT, a record indicating all unique symbols that
000003B4  2               were traced ( from MEAS_PTR^ )
000003B4  2            3) FLG_ARRAY, the flag word data structure containing the
000003B4  2               most recently read hardware flags
000003B4  2            4) MAC, the memory address counter
000003B4  2            5) TRACE_SPEC, the structure describing the specification
000003B4  2               which collected the data from the Dynamic Controller's
000003B4  2               point of view
000003B4  2            6) UNLOAD_COUNTER, the # of states previously shipped to the
000003B4  2               trace file
000003B4  2    Output:  1) TRACE_SPEC, the potentially modified specification
000003B4  2             2) UNLOAD_COUNTER, the updated # of states unloaded and
000003B4  2                shipped to the trace file
000003B4  2             3) RET_CODE, a return code describing what happened:
000003B4  2                  -26 indicates emulation error
000003B4  2                  -19 indicates variable not found
000003B4  2                  -18 indicates frame stack underflow
000003B4  2                  -17 indicates frame stack overflow
000003B4  2                  -16 indicates frame cannot be created
000003B4  2                  -15 indicates unimplemented measurement:  unload
000003B4  2                      cannot be accomplished
000003B4  2                   -2 indicates measurement structure is corrupt
000003B4  2                    0 indicates no error:  all data records completed
000003B4  2                    1 indicates end of file ( should never happen )
000003B4  2                    2 indicates invalid disc ( should never happen )
000003B4  2                    3 indicates file not found:  invalid DCB ( should never
000003B4  2                      happen )
000003B4  2                    5 indicates no free pages available
000003B4  2                    7 indicates file corrupt
000003B4  2                                                                          *)
000003B4  2  BEGIN (* Procedure TRANS_SPEC_OUT *)
000003B4  2    RET_CODE := NO_ERROR;
000003BA  2
000003BA  2    (* Determine what needs to be done with this spec *)
000003BA  2
000003BA  2    CASE TRACE_SPEC.UN_REQUEST OF
000003C3  2      UN_NOTHING:  (* Nothing to unload *)
000003CC  2        ; (* Do nothing *)
000003CC  2      UN_ENABLES:  (* Enable spec *)
000003CC  2        (* Check enable condition *)
000003CC  2        UNLOAD_SS ( TOTAL_MEAS, SYM_STRUCT, FLG_ARRAY, MAC,
000003CC  2                    TRACE_SPEC.HW_SPEC, UNLOAD_COUNTER, RET_CODE );
00000404  2      UN_TRACE_VAR:  (* Trace variables *)
00000404  2        (* Unload trace variables *)
00000404  2        UNLOAD_TV ( TOTAL_MEAS.MEAS_PTR^, SYM_STRUCT, FLG_ARRAY, MAC,
00000404  2                    TRACE_SPEC.HW_SPEC, UNLOAD_COUNTER, RET_CODE );
00000440  2      UN_TRACE_STAT:  (* Trace statements *)
00000440  2        (* Unload trace statements *)
00000440  2        UNLOAD_TS ( TOTAL_MEAS.MEAS_PTR^, SYM_STRUCT, FLG_ARRAY, MAC,
00000440  2                    TRACE_SPEC.HW_SPEC, UNLOAD_COUNTER, RET_CODE );
0000047C  2      UN_TRACE_RSTAT:  (* Real-time trace statements *)
0000047C  2        (* Unload real-time trace statements *)
0000047C  2        UNLOAD_TSR ( TOTAL_MEAS.MEAS_PTR^, SYM_STRUCT, FLG_ARRAY, MAC,
0000047C  2                     TRACE_SPEC.HW_SPEC, UNLOAD_COUNTER, RET_CODE );
000004B8  2      UN_TRACE_MODS:  (* Trace modules specific *)
000004B8  2        (* Unload trace modules specific *)
000004B8  2        UNLOAD_TM ( TOTAL_MEAS.MEAS_PTR^, SYM_STRUCT, FLG_ARRAY, MAC,
000004B8  2                    TRACE_SPEC.HW_SPEC, UNLOAD_COUNTER, RET_CODE );
000004F4  2      UN_TRACE_AMODS:  (* Trace modules all *)
000004F4  2        (* Unload trace modules all *)
000004F4  2        UNLOAD_TMA ( TOTAL_MEAS.MEAS_PTR^, SYM_STRUCT, FLG_ARRAY, MAC,
000004F4  2                     TRACE_SPEC.HW_SPEC, UNLOAD_COUNTER, RET_CODE );
00000530  2      UN_TRACE_DATA:  (* Trace data flow *)
00000530  2        (* Unload trace data flow *)
00000530  2        UNLOAD_TD ( TOTAL_MEAS.MEAS_PTR^, SYM_STRUCT, FLG_ARRAY, MAC,
00000530  2                    TRACE_SPEC.HW_SPEC, UNLOAD_COUNTER, RET_CODE );
```

```
0000056C  2      UN_TRACE_XXX:  (* Trace don't care *)
0000056C  2        (* Unload don't care trace *)
0000056C  2        UNLOAD_TX ( TOTAL_MEAS.MEAS_PTR^, SYM_STRUCT, FLG_ARRAY, MAC,
0000056C  2                    TRACE_SPEC.HW_SPEC, UNLOAD_COUNTER, RET_CODE );
000005A8  2      UN_TRACE_BRK:  (* Trace break *)
000005A8  2        (* Unload trace break *)
000005A8  2        UNLOAD_TB ( TOTAL_MEAS.MEAS_PTR^, SYM_STRUCT, FLG_ARRAY, MAC,
000005A8  2                    TRACE_SPEC.HW_SPEC, UNLOAD_COUNTER, RET_CODE );
000005E4  2      UN_TIME_MODS:  (* Time modules *)
000005E4  2        (* Unload duration modules *)
000005E4  2        UNLOAD_DM ( TOTAL_MEAS.MEAS_PTR^, SYM_STRUCT, FLG_ARRAY, MAC,
000005E4  2                    TRACE_SPEC.HW_SPEC, UNLOAD_COUNTER, RET_CODE );
00000620  2      UN_COUNT_STAT:  (* Count statements *)
00000620  2        (* Unload count statements *)
00000620  2        UNLOAD_CS ( TOTAL_MEAS.MEAS_PTR^, SYM_STRUCT, FLG_ARRAY, MAC,
00000620  2                    TRACE_SPEC.HW_SPEC, UNLOAD_COUNTER, RET_CODE );
0000065C  2      OTHERWISE (* Unimplemented measurement *)
0000065C  2        RET_CODE := UNIMP_MEAS
00000664  2    END; (* Of case statement *)
0000069A  2
0000069A  2    (* See if we are done with this spec yet *)
0000069A  2
0000069A  2    IF RET_CODE = KEEP_GOING
000006A8  2      THEN (* Don't turn spec off *)
000006A8  2        BEGIN (* Reset spec *)
000006A8  2          SET_SPEC ( TRACE_SPEC.PRIORITY, READY );
000006B8  2          RET_CODE := NO_ERROR
000006BE  2        END (* Reset spec *)
000006C2  2      ELSE (* Turn this spec off *)
000006C2  2        (* Close spec *)
000006C2  2        SET_SPEC ( TRACE_SPEC.PRIORITY, FINISHED )
000006D4  2  END; (* Procedure TRANS_SPEC_OUT *)
00000000  1  $GLOBPROC OFF$
00000000  1  .

508: Warning: field or entry alignment; record or array comparisons may not work

End of compilation, number of errors=     0

00000000  1  "68000" PREPROCESS
00000000  1  $EXTENSIONS ON$
00000000  1  $TITLE "Soda Dynamic Controller Memory Translator"
00000000  1  PROGRAM TRANS_MEM;
00000000  1  (*
00000000  1  ****************************** TRANS_MEM ******************************
00000000  1    Module TRANS_MEM contains the translator memory adjust routine.  This
00000000  1    routine is used after a post-processor and prior to a run to determine
00000000  1    how much trace data we can capture next and still have enough trace
00000000  1    memory to unload it all.
00000000  1    Author:  Kip Fulghum
00000000  1    Date:  1-8-85  Revised:  1-8-85
00000000  1  ***********************************************************************
00000000  1
00000000  1    TRANS_MEM contains the following routines:
00000000  1    -Global function TRANS_MAC_ADRS determines the starting memory address
00000000  1     counter which should be used for the next trace.
00000000  1
00000000  1    In addition, the following external routine is used:
00000000  1    TRACE_SIZE.
00000000  1                                                                      *)
00000000  1  (*
00000000  1                           **************************
00000000  1                           ***** Include Files *****
00000000  1                           **************************
00000000  1                                                                      *)
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1
00000000  1
00000000  1
```

```
00000000 1
00000000 1 $CALL_ABS_LONG$
00000000 1 (*
00000000 1                    **********************
00000000 1                    ***** TRACE_SIZE *****
00000000 1                    **********************
00000000 1                                                          *)
00000000 1 FUNCTION TRACE_SIZE:  L_INT; EXTERNAL;
00000000 1 (*
00000000 1   Function TRACE_SIZE to return the number of words left in the trace
00000000 1   file.  Provided as a Pascal external.
00000000 1                                                          *)
00000000 1
00000000 1
00000000 1
00000000 1
00000000 1
00000000 1 (*
00000000 1                  **************************
00000000 1                  ***** TRANS_MAC_ADRS *****
00000000 1                  **************************
00000000 1                                                          *)
00000000 1 $GLOBPROC ON$
00000000 1 FUNCTION TRANS_MAC_ADRS ( UNLOADER:  UN_TYPES; UNLOAD_COUNTER:  S_INT ):
00000000 2                          S_INT;
00000002 2 (*
00000002 2   Function TRANS_MAC_ADRS to determine the starting memory address
00000002 2   counter which should be used for the next trace.  Function determines
00000002 2   memory constraints for the type of measurement, then computes the
00000002 2   starting MAC which will insure that all captured data can be unloaded
00000002 2   ( ie there is enough trace memory to hold it all ) and that we will
00000002 2   unload approximately as much as the maximum.
00000002 2
00000002 2   Input:  1) UNLOADER, the unloader which will unload the captured data
00000002 2           2) UNLOAD_COUNTER, the current # of unloaded records
00000002 2   Output:  1) the starting memory address counter which should be
00000002 2               used to guarantee we can unload all we captured, or -1
00000002 2               indicating there is no guaranteed starting MAC, in
00000002 2               function name
00000002 2
00000002 2   TRANS_MAC_ADRS uses the following routine:  TRACE_SIZE.
00000002 2                                                          *)
00000002 2 VAR
00000002 2
00000002 2   WPTR:  S_INT; (* Words per trace record NOT including length word *)
00000004 2
00000004 2   BUFFER:  S_INT; (* Words to buffer:  can be 0 *)
00000006 2
00000006 2   SM:  L_INT; (* Starting memory address counter:  MUST be L_INT! *)
00000004 2
00000004 2 BEGIN (* Function TRANS_MAC_ADRS *)
00000004 2
00000004 2   (* Based on measurement, figure out space constraints *)
00000004 2
00000004 2   CASE UNLOADER OF
0000000E 2     UN_ENABLES:  (* Enable spec *)
0000000E 2       BEGIN (* Set for enable condition *)
0000000E 2         WPTR := 0;
00000012 2         BUFFER := 0
00000016 2       END; (* Set for enable condition *)
0000001A 2     UN_TRACE_VAR:  (* Trace variables *)
0000001A 2       BEGIN (* Set for trace variables *)
0000001A 2         WPTR := 15;
00000020 2         BUFFER := 0
00000024 2       END; (* Set for trace variables *)
00000028 2     UN_TRACE_STAT:  (* Trace statements *)
00000028 2       BEGIN (* Set for trace statements *)
00000028 2         WPTR := 14;
0000002E 2         BUFFER := 57 (* For 1 frame record *)
00000034 2       END; (* Set for trace statements *)
00000038 2     UN_TIME_MODS:  (* Time modules *)
00000038 2       BEGIN (* Set for duration modules *)
00000038 2         WPTR := 15;
0000003E 2         BUFFER := 48 (* For 3 other possible times *)
```

```
00000044  2        END; (* Set for duration modules *)
00000048  2      UN_COUNT_STAT:  (* Count statements *)
00000048  2        BEGIN (* Set for count statements *)
00000048  2          WPTR := 6;
0000004E  2          BUFFER := 1778 (* For 254 other possible counts *)
00000054  2        END; (* Set for count statements *)
00000058  2      OTHERWISE (* Standard  measurement *)
00000058  2        BEGIN (* Use standard values *)
00000058  2          WPTR := 14;
0000005E  2          BUFFER := 0
00000062  2        END (* Use standard values *)
00000062  2    END; (* Of case statement *)
00000098  2
00000098  2    (* Now, compute next starting MAC *)
00000098  2
00000098  2    (* WPTR + 1:  the + 1 is for the record length *)
00000098  2    SM := 4096 - ( ( TRACE_SIZE - BUFFER ) DIV ( WPTR + 1 ) );
000000C2  2
000000C2  2    IF ( SM >= 4095 ) OR ( UNLOAD_COUNTER + 1 >= MAX_UNLD_COUNT )
000000E4  2      THEN (* Not more than 1 memory location available or we've unloaded
000000E4  2              within 1 state as much as we should.  The "1" buffer is
000000E4  2              necessary to insure that memory full will not happen when
000000E4  2              we capture 1 state because trace data and trace break,
000000E4  2              among others, don't unload when memory is full! *)
000000E4  2        SM := -1
000000F0  2      ELSE (* Plenty of room in trace memory for another go at it and
000000F0  2              we haven't unloaded as much as we should *)
000000F0  2        IF UNLOAD_COUNTER > SM
000000FE  2          THEN (* We have too much room for the amount we should unload *)
000000FE  2            SM := UNLOAD_COUNTER + 1;
00000104  2
00000104  2    TRANS_MAC_ADRS := $_INT ( SM ) (* Return final function value *)
0000010C  2  END; (* Function TRANS_MAC_ADRS *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $LID_ABS_LONG$
00000000  1  $TITLE "Soga Static Controller:  Display/Modify Variable"
00000000  1  PROGRAM DISP_MOD;
00000000  1  (*
00000000  1  ************************************ DISP_MOD ************************************
00000000  1   DISP_MOD is the module containing the routines for displaying and
00000000  1   modifying variables.  For displaying, the current trace file is
00000000  1   updated to reflect the current value of the requested variable.  For
00000000  1   modifying, the requested variable is modified to reflect the given
00000000  1   value.
00000000  1   Author:  Kip Fulghum
00000000  1   Date:  1-9-84  Revised:  12-6-84
00000000  1  ******************************************************************************
00000000  1
00000000  1   DISP_MOD contains the following routines:
00000000  1   -Procedure GET_VAR_INFO gets the necessary information to display/
00000000  1    modify a variable.
00000000  1   -Global procedure DISPLAY_VARIABLE reads the given variable out of
00000000  1    emulation memory and writes it out to the current trace file.
00000000  1   -Global procedure MODIFY_VARIABLE writes the given value to the
00000000  1    given variable in emulation memory.
00000000  1
00000000  1   In addition, DISP_MOD uses the following external routines:
00000000  1   BUILD_CONTEXT, TEST_BITS,
00000000  1   READ_REG, GET_SEG_REGS, CREATE_FRAME, CLASS_PROC_DATA, P_ADDR,
00000000  1   LOAD_VARIABLE, and UNLOAD_VARIABLE.
00000000  1                                                                    *)
00000000  1  (*
00000000  1                        ***************************
00000000  1                        ***** Include Files *****
00000000  1                        ***************************
00000000  1                                                                    *)
```

```
00000000  1
00000000  1  #INCLUDE ER_CONST:SS_DYN
00000000  1
00000000  1  #INCLUDE COM_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1
00000000  1
00000000  1
00000000  1
00000000  1  $CALL_ABS_LONG$
00000000  1  (*
00000000  1                        *************************
00000000  1                        ***** BUILD_CONTEXT *****
00000000  1                        *************************
00000000  1                                                                    *)
00000000  1  PROCEDURE BUILD_CONTEXT ( NEXT_PC:  L_INT; VAR PROC_REC, PARENT_REC:
00000000  2                            CMD_DATA_TYPE; VAR B_CODE:  S_INT ); EXTERNAL;
00000000  1  (*
00000000  1    Procedure BUILD_CONTEXT to build a procedure and parent record based
00000000  1    on the given logical PC.  Provided as part of the HL interface to the
00000000  1    database.
00000000  1                                                                    *)
00000000  1
00000000  1
00000000  1
00000000  1
00000000  1
00000000  1  (*
00000000  1                          *********************
00000000  1                          ***** TEST_BITS *****
00000000  1                          *********************
00000000  1                                                                    *)
00000000  1  FUNCTION TEST_BITS ( BIT_WORD, TEST_WORD:  L_INT ):  BOOLEAN; EXTERNAL;
00000000  1  (*
00000000  1    Function TEST_BITS to see if all of the bits indicated in BIT_WORD
00000000  1    are set in TEST_WORD, ie "AND" both words and see if the result is
00000000  1    equal to BIT_WORD.  Provided as an assembly language external.
00000000  1                                                                    *)
00000000  1
00000000  1
00000000  1
00000000  1
00000000  1
00000000  1  (*
00000000  1                           ********************
00000000  1                           ***** READ_REG *****
00000000  1                           ********************
00000000  1                                                                    *)
00000000  1  PROCEDURE READ_REG ( REG:  S_INT; VAR REG_VALUE:  L_INT ); EXTERNAL;
00000000  1  (*
00000000  1    Procedure READ_REG to read the value of the given register ( 0 = PC,
00000000  1    1 = base ptr on entry, 2 = base ptr within ) from the emulator.  Data
00000000  1    is returned MSW, then LSW.  Provided as part of the message handler.
00000000  1                                                                    *)
00000000  1
00000000  1
00000000  1
00000000  1
00000000  1
00000000  1  (*
00000000  1                         ************************
00000000  1                         ***** GET_SEG_REGS *****
00000000  1                         ************************
00000000  1                                                                    *)
00000000  1  PROCEDURE GET_SEG_REGS ( VAR SEGS:  SEG_ARRAY_TYPE ); EXTERNAL;
00000000  1  (*
00000000  1    Procedure GET_SEG_REGS to read the segment registers of the processor
00000000  1    after a break.  Registers are returned MSW, then LSW.  Provided as
00000000  1    part of the message handler.
00000000  1                                                                    *)
```

```
(*
                        **************************
                        ***** CREATE_FRAME *****
                        **************************
                                                                   *)
PROCEDURE CREATE_FRAME ( VAR PROC_REC, PARENT_REC:  CMD_DATA_TYPE;
                        VAR FRAME_INFO:  FRAME_REC_TYPE; VAR
                        CRT_CODE:  S_INT ); EXTERNAL;
(*
  Procedure CREATE_FRAME to create a frame record based on the given
  procedure and parent information.  Provided as a Pascal external.
                                                                   *)

(*
                        ****************************
                        ***** CLASS_PROC_DATA *****
                        ****************************
                                                                   *)
FUNCTION CLASS_PROC_DATA ( VAR PROC_REC:  CMD_DATA_TYPE; ADRS, PREV_PC,
                           NEXT_PC:  L_INT ):  S_INT; EXTERNAL;
(*
  Function CLASS_PROC_DATA to determine what type of procedural data
  was captured.  Provided as a Pascal external.
                                                                   *)

(*
                        ******************
                        ***** P_ADDR *****
                        ******************
                                                                   *)
PROCEDURE P_ADDR ( LOGICAL_ADDR:  L_INT; VAR PHYSICAL_ADDR:  L_INT );
                   EXTERNAL;
(*
  Procedure P_ADDR to return the physical address equivalent of the
  given logical address.  Provided as a Pascal external.
                                                                   *)

(*
                        **************************
                        ***** LOAD_VARIABLE *****
                        **************************
                                                                   *)
PROCEDURE LOAD_VARIABLE ( VAR PROC_REC, VAR_REC, OFST_REC, VALUE_REC:
                          CMD_DATA_TYPE; VAR FRAME_REC:  FRAME_REC_TYPE;
                          VAR LD_CODE:  S_INT ); EXTERNAL;
(*
  Procedure LOAD_VARIABLE to load a given variable in emulation memory
  with a given value.  Provided as a Pascal external.
                                                                   *)

(*
                        ****************************
                        ***** UNLOAD_VARIABLE *****
                        ****************************
```

```
00000000  1                                                                       *)
00000000  1  PROCEDURE UNLOAD_VARIABLE ( VAR PROC_REC, VAR_REC, OFST_REC:
00000000  2                               CMD_DATA_TYPE; VAR FRAME_REC:
00000000  2                               FRAME_REC_TYPE; SYM_INDEX:  S_INT;
00000000  2                               P_COUNTER:  L_INT; VAR REC_COUNT,
00000000  2                               UNLD_CODE:  S_INT ); EXTERNAL;
00000000  1  (*
00000000  1    Procedure UNLOAD_VARIABLE to unload a given variable from emulation
00000000  1    memory and write it out to the trace file.  Provided as a Pascal
00000000  1    external.
00000000  1                                                                       *)
00000000  1
00000000  1
00000000  1
00000000  1
00000000  1
00000000  1  $CALL_PC_SHORT$
00000000  1  (*
00000000  1                             ***************************
00000000  1                             ***** GET_VAR_INFO *****
00000000  1                             ***************************
00000000  1                                                                       *)
00000000  1  PROCEDURE GET_VAR_INFO ( VAR VAR_REC, PROC_REC, PARENT_REC:
00000000  2                            CMD_DATA_TYPE; VAR FRAME_REC:  FRAME_REC_TYPE;
00000000  2                            VAR GET_CODE:  S_INT );
00000000  2  (*
00000000  2    Procedure GET_VAR_INFO to get the necessary information to display/
00000000  2    modify a variable.  If the variable is static, the segment registers
00000000  2    are determined.  If the variable is dynamic, the current context ( ie
00000000  2    where we are ) is determined and a frame is created.  If the variable
00000000  2    cannot be accessed or a frame cannot be made, an error code is
00000000  2    returned.  GET_VAR_INFO assumes that the emulator is running in the
00000000  2    monitor.
00000000  2
00000000  2    GET_VAR_INFO uses the following routines:  BUILD_CONTEXT, TEST_BITS,
00000000  2    READ_REG, GET_SEG_REGS, CREATE_FRAME, CLASS_PROC_DATA, and P_ADDR.
00000000  2
00000000  2    Input:  1) VAR_REC, the record describing the variable to be accessed
00000000  2    Output:  1) PROC_REC, the record describing the procedure we are
00000000  2                currently in
00000000  2                - Not valid if static variable
00000000  2             2) PARENT_REC, the record describing the parents of the above
00000000  2                procedure
00000000  2                - Not valid if static variable
00000000  2             3) FRAME_REC, the created frame for the current location
00000000  2                - Only segment info is valid if static variable
00000000  2             4) GET_CODE, the return code indicating what happened:
00000000  2                 -100 indicates someone else had an error, ie
00000000  2                      BUILD_CONTEXT
00000000  2                 -26 indicates emulation error
00000000  2                 -19 indicates variable not found
00000000  2                 -16 indicates frame cannot be created
00000000  2                   0 indicates no error
00000000  2                                                                       *)
00000000  2  VAR
00000000  2
00000000  2    NEXT_PC:  L_INT; (* Guess *)
00000004  2
00000004  2    DATA_TYPE:  S_INT; (* Guess again *)
00000004  2
00000004  2  BEGIN (* Procedure GET_VAR_INFO *)
00000004  2    GET_CODE := NO_ERROR;
0000000A  2    IF TEST_BITS ( 8, VAR_REC.FLAGS ) = TRUE
0000002C  2      THEN (* Dynamic variable *)
0000002C  2        BEGIN (* Create a frame *)
0000002C  2
0000002C  2          (* Create current context *)
0000002C  2
0000002C  2          READ_REG ( 0, NEXT_PC );
0000003A  2          BUILD_CONTEXT ( NEXT_PC, PROC_REC, PARENT_REC, GET_CODE );
0000005C  2          IF GET_CODE = NO_ERROR
00000066  2            THEN (* We have a context *)
00000066  2              CREATE_FRAME ( PROC_REC, PARENT_REC, FRAME_REC, GET_CODE )
0000008E  2            ELSE (* Problems *)
```

```
0000008E  2              GET_CODE := QUIET_ERROR; (* BUILD_CONTEXT outputs error *)
00000096  2
00000096  2          (* Determine if we can access variable *)
00000096  2
00000096  2          IF GET_CODE = NO_ERROR
000000A0  2            THEN (* We have a frame *)
000000A0  2              BEGIN (* Make sure variable can be accessed where we are *)
000000A0  2                (* Logical --> physical *)
000000A0  2                P_ADDR ( NEXT_PC, NEXT_PC );
000000B0  2                DATA_TYPE := CLASS_PROC_DATA ( PROC_REC, NEXT_PC,
000000B0  2                                                -1, -1 );
000000B6  2                IF ( VAR_REC.PROC_NUM = PROC_REC.PROC_NUM ) AND
000000B6  2                   ( DATA_TYPE <> PSEUDO_ENTRY ) AND
000000B6  2                   ( DATA_TYPE <> C_ZONE ) AND
000000B6  2                   ( DATA_TYPE <> PSEUDO_EXIT )
00000118  2                  THEN (* In non-user code of variable's procedure *)
00000118  2                    GET_CODE := VAR_NOT_FOUND
00000120  2              END (* Make sure variable can be accessed where we are *)
00000120  2        END (* Create a frame *)
00000124  2      ELSE (* Static variable *)
00000124  2        (* Just get segments *)
00000124  2        GET_SEG_REGS ( FRAME_REC.SEGMENTS )
00000132  2  END; (* Procedure GET_VAR_INFO *)
00000000  1
00000000  1
00000000  1
00000000  1
00000000  1
00000000  1  (*
00000000  1                        ************************
00000000  1                        ***** DISPLAY_VAR *****
00000000  1                        ************************
00000000  1                                                                    *)
00000000  1  $GLOBPROC ONS
00000000  1  PROCEDURE DISPLAY_VAR ( VAR MEAS_:  CMD_DATA_ARRAY; VAR SYMS_:
00000000  2                          SYM_DESCRIPS; VAR UNLD_COUNT, R_CODE:  S_INT );
00000000  2  (*
00000000  2    Procedure DISPLAY_VARIABLE to read the given variable out of emulation
00000000  2    memory and write it out to the current trace file.  Procedure
00000000  2    determines everthing about the variable, then unloads the variable
00000000  2    out to the trace file.  DISPLAY_VAR assumes that the emulator is
00000000  2    running in the monitor.
00000000  2
00000000  2    DISPLAY_VAR uses the following routines:  GET_VAR_INFO and
00000000  2    UNLOAD_VARIABLE.
00000000  2
00000000  2    Input:  1) MEAS_, the input structure to the loader indicating
00000000  2               what the measurement is
00000000  2            2) SYMS_, a list of all unique symbols involved in the
00000000  2               measurement
00000000  2            3) UNLD_COUNT, the previous # of states unloaded and
00000000  2               shipped out to the trace file
00000000  2    Output:  1) UNLD_COUNT, the updated # of states unloaded and output
00000000  2                to the trace file
00000000  2             2) R_CODE, the return code indicating how things turned out:
00000000  2                 -100 indicates someone else had an error, ie
00000000  2                      BUILD_CONTEXT
00000000  2                 -26 indicates emulation error
00000000  2                 -19 indicates variable not found
00000000  2                 -16 indicates frame cannot be created
00000000  2                  -2 indicates measurement descriptor is corrupt
00000000  2                   0 indicates no error:  data records completed
00000000  2                   3 indicates file not found:  invalid DCB ( should never
00000000  2                     happen )
00000000  2                   5 indicates no free pages available
00000000  2                   7 indicates file corrupt
00000000  2                                                                    *)
00000000  2  VAR
00000000  2
00000000  2    CUR_FRAME:  FRAME_PTR_TYPE; (* Pointer to current frame record *)
00000004  2
00000004  2    START_PROC:  CMD_DATA_PTR; (* Pointer to starting proc info *)
00000008  2
00000008  2    START_PARENTS:  CMD_DATA_PTR; (* Pointer to starting parent info *)
```

```
0000013A  2
0000013A  2  BEGIN (* Procedure DISPLAY_VAR *)
0000013A  2    R_CODE := NO_ERROR;
00000140  2    (* Start creating the current context *)
00000140  2    NEW ( CUR_FRAME );
00000152  2    NEW ( START_PROC );
00000164  2    NEW ( START_PARENTS );
00000176  2    GET_VAR_INFO ( MEAS_ [ 0 ], START_PROC^, START_PARENTS^, CUR_FRAME^,
00000176  2                   R_CODE );
0000019E  2    IF R_CODE = NO_ERROR
000001A8  2      THEN (* All problems have been resolved *)
000001A8  2        (* Get the sucker unloaded *)
000001A8  2        UNLOAD_VARIABLE ( START_PROC^, MEAS_ [ 0 ], MEAS_ [ 1 ],
000001A8  2                          CUR_FRAME^, 0, 0, UNLD_COUNT, R_CODE );
000001DA  2    (* Clean up after ourselves *)
000001DA  2    DISPOSE ( START_PARENTS );
000001EC  2    DISPOSE ( START_PROC );
000001FE  2    DISPOSE ( CUR_FRAME )
00000210  2  END; (* Procedure DISPLAY_VAR *)
00000000  1  $GLOBVAR OFF$
00000000  1
00000000  1
00000000  1
00000000  1
00000000  1
00000000  1  (*
00000000  1                          **********************
00000000  1                          ***** MODIFY_VAR *****
00000000  1                          **********************
00000000  1                                                                      *)
00000000  1  $GLOBPROC ON$
00000000  1  PROCEDURE MODIFY_VAR ( VAR MEAS_:  CMD_DATA_ARRAY; VAR SYMS_:
00000000  2                          SYM_DESCRIPS; VAR UNLD_COUNT, R_CODE:  S_INT );
00000000  2  (*
00000000  2    Procedure MODIFY_VARIABLE to write the given value to the given
00000000  2    variable in emulation memory.  Procedure determines everything about
00000000  2    the variable, loads, then unloads the variable.  MODIFY_VAR
00000000  2    assumes that the emulator is running in the monitor.
00000000  2
00000000  2    MODIFY_VAR uses the following routines:  GET_VAR_INFO, LOAD_VARIABLE,
00000000  2    and UNLOAD_VARIABLE.
00000000  2
00000000  2    Input:  1) MEAS_, the input structure to the loader indicating
00000000  2               what the measurement is
00000000  2            2) SYMS_, a list of all unique symbols involved in the
00000000  2               measurement
00000000  2            3) UNLD_COUNT, the previous # of states unloaded and
00000000  2               shipped out to the trace file
00000000  2    Output:  1) UNLD_COUNT, the updated # of states unloaded and output
00000000  2                to the trace file
00000000  2             2) R_CODE, the return code indicating how things turned out:
00000000  2                 -100 indicates someone else had an error, ie
00000000  2                        BUILD_CONTEXT
00000000  2                 -26 indicates emulation error
00000000  2                 -19 indicates variable not found
00000000  2                 -16 indicates frame cannot be created
00000000  2                  -2 indicates measurement descriptor is corrupt
00000000  2                   0 indicates no error:  variable modified
00000000  2                   3 indicates file not found:  invalid DCB ( should never
00000000  2                     happen )
00000000  2                   5 indicates no free pages available
00000000  2                   7 indicates file corrupt
00000000  2                                                                      *)
00000000  2  VAR
00000000  2
00000000  2    CUR_FRAME:  FRAME_PTR_TYPE; (* Pointer to current frame record *)
00000004  2
00000004  2    START_PROC:  CMD_DATA_PTR; (* Pointer to starting proc info *)
00000008  2
00000008  2    START_PARENTS:  CMD_DATA_PTR; (* Pointer to starting parent info *)
00000218  2
00000218  2  BEGIN (* Procedure MODIFY_VAR *)
00000218  2    R_CODE := NO_ERROR;
0000021E  2    (* Start creating the current context *)
```

```
0000021E  2     NEW ( CUR_FRAME );
00000230  2     NEW ( START_PROC );
00000242  2     NEW ( START_PARENTS );
00000254  2     GET_VAR_INFO ( MEAS_ [ 1 ], START_PROC^, START_PARENTS^, CUR_FRAME^,
00000254  2                     R_CODE );
0000027E  2     IF R_CODE = NO_ERROR
00000288  2       THEN (* All problems have been resolved *)
00000288  2         (* Get the sucker loaded *)
00000288  2         LOAD_VARIABLE ( START_PROC^, MEAS_ [ 1 ], MEAS_ [ 2 ],
000002C8  2                         MEAS_ [ 0 ], CUR_FRAME^, R_CODE );
000002B4  2     IF R_CODE = NO_ERROR
000002BE  2       THEN (* All problems have been resolved *)
000002BE  2         (* Get the sucker unloaded *)
000002BE  2         UNLOAD_VARIABLE ( START_PROC^, MEAS_ [ 1 ], MEAS_ [ 2 ],
000002EE  2                           CUR_FRAME^, 0, 0, UNLD_COUNT, R_CODE );
000002F2  2     (* Clean up after ourselves *)
000002F2  2     DISPOSE ( START_PARENTS );
00000304  2     DISPOSE ( START_PROC );
00000316  2     DISPOSE ( CUR_FRAME )
00000328  2   END; (* Procedure MODIFY_VAR *)
00000000  1   $GLOBVAR OFF$
00000000  1   .

508: Warning: field or entry alignment; record or array comparisons may not work

End of compilation, number of errors=    0

00000000  1   "68000" PREPROCESS
00000000  1   $EXTENSIONS ON$
00000000  1   $TITLE "Soda Dynamic Controller:  Start/Sequence/Stop"
00000000  1   PROGRAM START_STOP;
00000000  1   (*
00000000  1   ****************************** START_STOP ******************************
00000000  1     START_STOP is the module containing all the start/sequence/stop
00000000  1     pre and post-processors.  For pre-processing, the necessary start/
00000000  1     sequence/stop specification is either added to the existing trace
00000000  1     specification, or an entirely new specification is created and
00000000  1     inserted into the spec list, depending on the measurement and start
00000000  1     specs.  For post-processing, it is determined if the start condition
00000000  1     has been met.
00000000  1     Author:  Kip Fulghum
00000000  1     Date:  10-13-83  Revised:  1-7-85
00000000  1   ************************************************************************
00000000  1
00000000  1     START_STOP contains the following routines:
00000000  1     -Procedure SET_UP_SS sets up an enable/disable sequence term's paths.
00000000  1     -Procedure RT_SS sets up a real-time enable/disable sequence.
00000000  1     -Procedure NRT_SS sets up a non-real-time enable/disable sequence.
00000000  1     -Global procedure LOAD_SS serves as the pre-processor for the
00000000  1      start/sequence/stop specification.
00000000  1     -Global procedure UNLOAD_SS serves as the post-processor for the
00000000  1      start/sequence/stop specification.
00000000  1
00000000  1     In addition, START_STOP uses the following external routines:
00000000  1     START_SPEC, START_GEN, SEQUENCE, ADD_PATH, CLOSE_OR_NODE,
00000000  1     CLOSE_TO_LIST, START_CONTROL, SET_FEATURE,
00000000  1     GET_VALUE_MASK, GET_BUS_MASK, GET_OFFSET, P_ADDR,
00000000  1     DRIVE_IMB, and RECEIVE_IMB.
00000000  1                                                                        *)
00000000  1   (*
00000000  1                             *************************
00000000  1                             ***** Include Files *****
00000000  1                             *************************
00000000  1                                                                        *)
00000000  1
00000000  1   #INCLUDE ER_CONST:SS_DYN
00000000  1
00000000  1   #INCLUDE COM_TYPES:SS_DYN
00000000  1
00000000  1   #INCLUDE LD_TYPES:SS_DYN
00000000  1
00000000  1   #INCLUDE ICMD_DATA:SODAKOM
00000000  1
00000000  1   #INCLUDE TRANS_TYPES:SS_DYN
```

```
00000000  1
00000000  1
00000000  1
00000000  1
00000000  1
00000000  1  $CALL_ABS_LOHCS
00000000  1  (*
00000000  1                          ***********************
00000000  1                          ***** START_SPEC *****
00000000  1                          ***********************
00000000  1                                                                    *)
00000000  1  PROCEDURE START_SPEC ( PRI:  S_INT; TIME, BREAK:  BOOLEAN; VAR SPEC_PTR:
00000000  2                        TRACE_SPEC_PTR ); EXTERNAL;
00000000  1  (*
00000000  1    Procedure START_SPEC to allocate and prepare a trace spec for use.
00000000  1    Provided as a Pascal external.
00000000  1                                                                    *)
00000000  1
00000000  1
00000000  1
00000000  1
00000000  1
00000000  1  (*
00000000  1                          **********************
00000000  1                          ***** START_GEN *****
00000000  1                          **********************
00000000  1                                                                    *)
00000000  1  PROCEDURE START_GEN ( VAR GENERATOR:  FUNC_RESOURCE; START_STATE,
00000000  2                       NEXT_STATE:  S_INT; VAR STATE_PTR:  STATE_REC_PTR;
00000000  2                       VAR IO_PTR:  I_O_REC_PTR; VAR HIGH_SET:
00000000  2                       HIGH_LEVEL_SET ); EXTERNAL;
00000000  1  (*
00000000  1    Procedure START_GEN to prepare a function generator for use.
00000000  1    Provided as a Pascal external.
00000000  1                                                                    *)
00000000  1
00000000  1
00000000  1
00000000  1
00000000  1
00000000  1  (*
00000000  1                          *********************
00000000  1                          ***** SEQUENCE *****
00000000  1                          *********************
00000000  1                                                                    *)
00000000  1  PROCEDURE SEQUENCE ( VAR GENERATOR:  FUNC_RESOURCE; VAR STATE_PTR:
00000000  2                      STATE_REC_PTR; VAR IO_PTR:  I_O_REC_PTR; VAR
00000000  2                      HIGH_SET:  HIGH_LEVEL_SET; VAR SEQ_CODE:  S_INT );
00000000  2                      EXTERNAL;
00000000  1  (*
00000000  1    Procedure SEQUENCE to sequence a new state after the given state.
00000000  1    Provided as a Pascal external.
00000000  1                                                                    *)
00000000  1
00000000  1
00000000  1
00000000  1
00000000  1
00000000  1  (*
00000000  1                          *********************
00000000  1                          ***** ADD_PATH *****
00000000  1                          *********************
00000000  1                                                                    *)
00000000  1  PROCEDURE ADD_PATH ( RSRC_TYPE:  LL_TYPE; PATH_ID:  S_INT; LO_VALUE,
00000000  2                      LO_MASK, HI_VALUE, HI_MASK:  L_INT; VAR
00000000  2                      POS_HL_SET:  HIGH_LEVEL_SET; VAR LO_ARRAY:
00000000  2                      LL_ARRAY_TYPE; VAR HI_ARRAY:  HL_ARRAY_TYPE;
00000000  2                      VAR IO:  I_O_REC; VAR CODE:  S_INT ); EXTERNAL;
00000000  1  (*
00000000  1    Procedure ADD_PATH to create and add a low to high level resource
00000000  1    path to the given function generator I/O node's input function
00000000  1    description.  Provided as a Pascal external.
00000000  1                                                                    *)
00000000  1
```

```
00000000  1
00000000  1
00000000  1
00000000  1
00000000  1  (*
00000000  1                      **************************
00000000  1                      ***** CLOSE_OR_NODE *****
00000000  1                      **************************
00000000  1                                                             *)
00000000  1  PROCEDURE CLOSE_OR_NODE ( FINAL_OUTS:  OUT_SET_TYPE; VAR IO:  I_O_REC;
00000000  2                           VAR CLOSE_CODE:  S_INT ); EXTERNAL;
00000000  1  (*
00000000  1    Procedure CLOSE_OR_NODE to close out a function generator I/O node
00000000  1    consisting of a number of ORed terms.  Provided as a Pascal external.
00000000  1                                                             *)
00000000  1
00000000  1
00000000  1
00000000  1
00000000  1
00000000  1  (*
00000000  1                      **************************
00000000  1                      ***** CLOSE_IO_LIST *****
00000000  1                      **************************
00000000  1                                                             *)
00000000  1  PROCEDURE CLOSE_IO_LIST ( DC_STATE:  S_INT; DC_OUTS:  OUT_SET_TYPE;
00000000  2                           VAR LAST_IO:  I_O_REC ); EXTERNAL;
00000000  1  (*
00000000  1    Procedure CLOSE_IO_LIST to close out a function generator I/O list
00000000  1    with a don't care I/O node.  Provided as a Pascal excernal.
00000000  1                                                             *)
00000000  1
00000000  1
00000000  1
00000000  1
00000000  1
00000000  1  (*
00000000  1                      **************************
00000000  1                      ***** START_CONTROL *****
00000000  1                      **************************
00000000  1                                                             *)
00000000  1  PROCEDURE START_CONTROL ( ON_OFF:  CONDITION_TYPE; VAR FEATS:
00000000  2                           FEAT_ARRAY_TYPE ); EXTERNAL;
00000000  1  (*
00000000  1    Procedure START_CONTROL to turn the START enabled functions on
00000000  1    or off.  Provided as a Pascal external.
00000000  1                                                             *)
00000000  1
00000000  1
00000000  1
00000000  1
00000000  1
00000000  1  (*
00000000  1                      **************************
00000000  1                      ***** SET_FEATURE *****
00000000  1                      **************************
00000000  1                                                             *)
00000000  1  PROCEDURE SET_FEATURE ( ON_OFF:  CONDITION_TYPE; VAR FEAT_SIG:
00000000  2                         FEATURE_REC ); EXTERNAL;
00000000  1  (*
00000000  1    Procedure SET_FEATURE to turn on/off a feature signal.  Provided as
00000000  1    a Pascal external.
00000000  1                                                             *)
00000000  1
00000000  1
00000000  1
00000000  1
00000000  1
00000000  1  (*
00000000  1                      **************************
00000000  1                      ***** GET_VALUE_MASK *****
00000000  1                      **************************
00000000  1                                                             *)
00000000  1  PROCEDURE GET_VALUE_MASK ( ACCESS:  S_INT; VAR VALUE, MASK:  L_INT );
```

```
00000000 2                          EXTERNAL;
00000000 1  (*
00000000 1   Procedure GET_VALUE_MASK to determine the appropriate value and
00000000 1   mask for tracing different processor status, ie reads, writes, etc.
00000000 1   Provided as a Pascal external.
00000000 1                                                                      *)
00000000 1
00000000 1
00000000 1
00000000 1
00000000 1
00000000 1  (*
00000000 1                        *************************
00000000 1                        ***** GET_BUS_MASK *****
00000000 1                        *************************
00000000 1                                                                      *)
00000000 1  FUNCTION GET_BUS_MASK ( BUS:  S_INT ):  L_INT; EXTERNAL;
00000000 1  (*
00000000 1   Function GET_BUS_MASK to return the processor specific mask containing
00000000 1   all 1s for all bits on the given bus.  Provided as a Pascal external.
00000000 1                                                                      *)
00000000 1
00000000 1
00000000 1
00000000 1
00000000 1
00000000 1  (*
00000000 1                        ***********************
00000000 1                        ***** GET_OFFSET *****
00000000 1                        ***********************
00000000 1                                                                      *)
00000000 1  FUNCTION GET_OFFSET:  L_INT; EXTERNAL;
00000000 1  (*
00000000 1   Function GET_OFFSET to return the appropriate processor pre-fetch
00000000 1   offset.  Provided as a Pascal external.
00000000 1                                                                      *)
00000000 1
00000000 1
00000000 1
00000000 1
00000000 1
00000000 1  (*
00000000 1                        *******************
00000000 1                        ***** P_ADDR *****
00000000 1                        *******************
00000000 1                                                                      *)
00000000 1  PROCEDURE P_ADDR ( LOGICAL_ADDR:  L_INT; VAR PHYSICAL_ADDR:  L_INT );
00000000 2                 EXTERNAL;
00000000 1  (*
00000000 1   Procedure P_ADDR to return the physical address equivalent of the
00000000 1   given logical address.  Provided as a Pascal external.
00000000 1                                                                      *)
00000000 1
00000000 1
00000000 1
00000000 1
00000000 1
00000000 1  $CALL_PC_SHORT$
00000000 1  (*
00000000 1                        **********************
00000000 1                        ***** DRIVE_IMB *****
00000000 1                        **********************
00000000 1                                                                      *)
00000000 1  PROCEDURE DRIVE_IMB ( LINE:  IMB_LINES; ID_OFFSET:  S_INT; STOP:
00000000 2                   CMD_ARRAY_PTR; VAR DEFAULT_SIGS, LAST_SIGS:
00000000 2                   OUT_SET_TYPE; VAR SPEC:  HW_SPEC_REC; VAR STATE:
00000000 2                   STATE_REC_PTR; VAR IMB_CODE:  S_INT ); EXTERNAL;
00000000 1  (*
00000000 1   Procedure DRIVE_IMB to set up driving a signal on IMB.  Provided as
00000000 1   a Pascal external.
00000000 1                                                                      *)
00000000 1
00000000 1
00000000 1
```

```
00000000  1
00000000  1
00000000  1  (*
00000000  1                             ***********************
00000000  1                             ***** RECEIVE_IMB *****
00000000  1                             ***********************
00000000  1                                                                           *)
00000000  1  PROCEDURE RECEIVE_IMB ( LINE:  IMB_LINES; ID_OFFSET:  S_INT; STOP:
00000000  2                             CMD_ARRAY_PTR; VAR DEFAULT_SIGS, LAST_SIGS:
00000000  2                             OUT_SET_TYPE; VAR SPEC:  HW_SPEC_REC; VAR STATE:
00000000  2                             STATE_REC_PTR; VAR IMB_CODE:  S_INT ); EXTERNAL;
00000000  1  (*
00000000  1    Procedure RECEIVE_IMB to set up receiving a signal on IMB.  Provided
00000000  1    as a Pascal external.
00000000  1                                                                           *)
00000000  1
00000000  1
00000000  1
00000000  1
00000000  1
00000000  1  (*
00000000  1                             ***********************
00000000  1                             ***** SET_UP_SS *****
00000000  1                             ***********************
00000000  1                                                                           *)
00000000  1  PROCEDURE SET_UP_SS ( VAR CONDITION:  CMD_DATA_ARRAY; ID_OFFSET:
00000000  2                        S_INT; VAR HIGHS:  HIGH_LEVEL_SET; VAR I:  S_INT;
00000000  2                        VAR SPEC:  HW_SPEC_REC; VAR IO:  I_O_REC; VAR
00000000  2                        SET_CODE:  S_INT );
00000000  2  (*
00000000  2    Procedure SET_UP_SS to set up an enable/disable sequence term's paths.
00000000  2    Procedure loops through the given condition stack, starting at the
00000000  2    given index, adding all needed paths to the given I/O node, one at a
00000000  2    time, until the end of the sequence term is reached.  If any path
00000000  2    cannot be created, an error is returned.
00000000  2
00000000  2    SET_UP_SS uses the following routines:  ADD_PATH, GET_VALUE_MASK,
00000000  2    GET_BUS_MASK, GET_OFFSET, and P_ADDR.
00000000  2
00000000  2    Input:  1) CONDITION, the command array containing the start/stop
00000000  2               specification
00000000  2            2) ID_OFFSET, the offset to which the path I.D. should be
00000000  2               added, ie measurement paths have I.D.s 0-999 ( offset = 0 ),
00000000  2               starts have 1000-1999 ( offset = 1000 ), stops have 2000-
00000000  2               2999 ( offset = 2000 )
00000000  2            3) HIGHS, the set of possible high level resources to choose
00000000  2               from when creating the paths
00000000  2            4) I, the index into CONDITION that marks the beginning of
00000000  2               this sequence term
00000000  2            5) SPEC, the current hardware specification
00000000  2            6) IO, the input/output record to add the paths to
00000000  2    Output:  1) I, the last index into CONDITION used
00000000  2             2) SPEC, the modified hardware specification from which the
00000000  2                resources were allocated
00000000  2             3) IO, the modified input/output record
00000000  2             4) SET_CODE, a return code with the following values:
00000000  2                 -6 indicates function overflow
00000000  2                 -5 indicates out of fast sequencer resources
00000000  2                 -4 indicates out of high level hardware resources
00000000  2                 -3 indicates out of low level hardware resources
00000000  2                  0 indicates no error:  operation completed
00000000  2                                                                           *)
00000000  2  VAR
00000000  2
00000000  2    OP_VALUE:  L_INT; (* Processor value for opcode fetch *)
00000004  2
00000004  2    OP_MASK:  L_INT; (* Processor mask for opcode fetch *)
00000008  2
00000008  2    RSRC_VALUE:  L_INT; (* Value to load resource with *)
0000000C  2
0000000C  2    RSRC_MASK:  L_INT; (* Mask to load resource with *)
00000010  2
00000010  2    PREFETCH:  L_INT; (* Pre-fetch offset *)
00000004  2
```

```
00000004 2  BEGIN (* Procedure SET_UP_SS *)
00000004 2    SET_CODE := NO_ERROR;
0000000A 2
0000000A 2    (* Get processor specific values/masks *)
0000000A 2
0000000A 2    GET_VALUE_MASK ( OPCODE, OP_VALUE, OP_MASK );
00000022 2    PREFETCH := GET_OFFSET;
0000002C 2    RSRC_MASK := OP_MASK + GET_BUS_MASK ( 0 );
00000040 2
00000040 2    (* Set up start/stop condition *)
00000040 2
00000040 2    WHILE ( CONDITION [ I ].OP_CODE < FOLLOWED_BY ) AND
00000040 2          ( SET_CODE = NO_ERROR ) DO
0000006E 2      WITH CONDITION [ I ] DO
00000080 2        BEGIN (* Assign resources to watch all given conditions *)
00000080 2          IF ( OP_CODE = PROC_OP ) OR ( OP_CODE = LINE_OP )
0000009C 2            THEN (* This is a module/line access *)
0000009C 2              BEGIN (* Set up module/line enable/disable *)
0000009C 2                IF OP_CODE = PROC_OP
000000A4 2                  THEN (* Procedure *)
000000A4 2                    IF STATUS = ON_ENTRY
000000B0 2                      THEN (* We want entry point *)
000000B0 2                        RSRC_VALUE := ENTRY + PREFETCH
000000C4 2                      ELSE (* We want exit point *)
000000C4 2                        RSRC_VALUE := EXIT
000000D2 2                  ELSE (* Line *)
000000D2 2                    RSRC_VALUE := ADDRESS + PREFETCH;
000000E2 2                (* Logical --> physical *)
000000E2 2                P_ADDR ( RSRC_VALUE, RSRC_VALUE );
000000F2 2                RSRC_VALUE := RSRC_VALUE + OP_VALUE;
000000FA 2                ADD_PATH ( ADDRESS_EQUATE, I+ID_OFFSET, RSRC_VALUE,
000000FA 2                           RSRC_MASK, 0, 0, HIGHS, SPEC.LOW_LEVELS,
000000FA 2                           SPEC.HIGH_LEVELS, IO, SET_CODE )
00000142 2              END; (* Set up module/line enable/disable *)
00000142 2          I := I + 1
0000014C 2        END (* Assign resources to watch all given conditions *)
00000150 2  END; (* Procedure SET_UP_SS *)
00000000 1
00000000 1
00000000 1
00000000 1
00000000 1
00000000 1  (*
00000000 1                        ******************
00000000 1                        ***** RT_SS *****
00000000 1                        ******************
00000000 1                                                                  *)
00000000 1  PROCEDURE RT_SS ( VAR CONDITION:  CMD_DATA_ARRAY; ID_OFFSET:  S_INT;
00000000 2                    DEFAULT_SIGS, LAST_SIGS:  OUT_SET_TYPE; VAR SPEC:
00000000 2                    HW_SPEC_REC; VAR STATE:  STATE_REC_PTR; VAR
00000000 2                    RT_CODE:  S_INT );
00000000 2  (*
00000000 2    Procedure RT_SS to set up a real-time enable/disable sequence.
00000000 2    Procedure loops through the entire enable/disable condition stack,
00000000 2    setting up sequence states as it encounters them.  All sequence states
00000000 2    are set up to output the given default signals.  The last state is
00000000 2    set up to output the given last signals.  If too many sequence states
00000000 2    or resources are needed, an error is returned.
00000000 2
00000000 2    RT_SS uses the following routines:  SET_UP_SS, SEQUENCE,
00000000 2    CLOSE_OR_NODE, CLOSE_IO_LIST, and START_CONTROL.
00000000 2
00000000 2    Input:  1) CONDITION, the command array containing the start/stop
00000000 2               specification
00000000 2            2) ID_OFFSET, the offset to which the path I.D. should be
00000000 2               added, ie measurement paths have I.D.s 0-999 ( offset = 0 ),
00000000 2               starts have 1000-1999 ( offset = 1000 ), stops have 2000-
00000000 2               2999 ( offset = 2000 )
00000000 2            3) DEFAULT_SIGS,  a set of default output signals to drive
00000000 2               during all sequence states
00000000 2            4) LAST_SIGS, a set of output signals to drive upon
00000000 2               completion of the last sequence state
00000000 2            5) SPEC, the hardware specification to which the enable/
00000000 2               disable sequence is to be added
```

```
00000000  2            6) STATE, a pointer to the state to which this sequence is to
00000000  2               be added after
00000000  2   Output:  1) SPEC, the modified hardware specification
00000000  2            2) STATE, a pointer to the last state in the created sequence
00000000  2            3) RT_CODE, a code specifying what happened:
00000000  2                -7 indicates out of sequence states
00000000  2                -6 indicates function overflow
00000000  2                -5 indicates out of fast sequencer resources
00000000  2                -4 indicates out of high level hardware resources
00000000  2                -3 indicates out of low level hardware resources
00000000  2                 0 indicates no error:  operation completed
00000000  2                                                                      *)
00000000  2  VAR
00000000  2
00000000  2    I:  S_INT; (* Index into condition array *)
00000002  2
00000002  2    IO:  I_O_REC_PTR; (* Current function generator input/output node *)
00000006  2
00000006  2    HL_SET:  HIGH_LEVEL_SET; (* Current set of useable high level
00000158  2                                  resources *)
00000158  2
00000158  2  BEGIN (* Procedure RT_SS *)
00000158  2    RT_CODE := NO_ERROR;
0000015E  2
0000015E  2    IF IO_OFFSET = 1000
0000016A  2      THEN (* Setting up enables *)
0000016A  2        START_CONTROL ( ON, SPEC.FEATURES ); (* Turn on start *)
0000017C  2
0000017C  2    (* Set up all enable/disable sequence states *)
0000017C  2
0000017C  2    I := 0;
00000180  2    WHILE ( CONDITION [ I ].OP_CODE <> EOL ) AND ( RT_CODE = NO_ERROR ) DO
000001AC  2      BEGIN (* Set up this sequence state *)
000001AC  2        SEQUENCE ( SPEC.FUNC_GENERATORS [ X ], STATE, IO, HL_SET,
000001AC  2                   RT_CODE );
000001B6  2        IF RT_CODE = NO_ERROR
000001E0  2          THEN (* Sequence state set up *)
000001E0  2            SET_UP_SS ( CONDITION, IO_OFFSET, HL_SET, I, SPEC, IO^,
000001E0  2                        RT_CODE );
0000020E  2        IF RT_CODE = NO_ERROR
00000218  2          THEN (* Terms in sequence state set up *)
00000218  2            BEGIN (* Set up outputs for this state *)
00000218  2              IF CONDITION [ I ].OP_CODE = FOLLOWED_BY
00000230  2                THEN (* More sequence states to follow *)
00000230  2                  BEGIN (* Set up for more states *)
00000230  2                    I := I + 1; (* Move past "followed by" *)
00000234  2                    (* Close out this I/O node *)
00000234  2                    CLOSE_OR_NODE ( DEFAULT_SIGS, IO^, RT_CODE )
00000250  2                  END (* Set up for more states *)
00000254  2                ELSE (* End of sequence *)
00000254  2                  (* Close out last I/O node *)
00000254  2                  CLOSE_OR_NODE ( LAST_SIGS, IO^, RT_CODE );
00000270  2              (* Make sure defaults are driven all the time *)
00000270  2              CLOSE_IO_LIST ( STATE^.CUR_STATE, DEFAULT_SIGS, IO^ )
0000028C  2            END (* Set up outputs for this state *)
0000028C  2      END (* Set up this sequence state *)
00000290  2  END; (* Procedure RT_SS *)
00000000  1
00000000  1
00000000  1
00000000  1
00000000  1
00000000  1  (*
00000000  1                               *******************
00000000  1                               ***** NRT_SS *****
00000000  1                               *******************
00000000  1                                                                      *)
00000000  1  PROCEDURE NRT_SS ( VAR CONDITION:  CMD_DATA_ARRAY; IO_OFFSET:  S_INT;
00000000  2                     DEFAULT_SIGS, LAST_SIGS:  OUT_SET_TYPE; HEAD:
00000000  2                     TRACE_SPEC_PTR; VAR STATE:  STATE_REC_PTR; VAR
00000000  2                     NRT_CODE:  S_INT );
00000000  2  (*
00000000  2    Procedure NRT_SS to set up a non-real-time enable/disable sequence.
00000000  2    If sequence is for an enable, procedure loops through the entire
```

```
00000000  2    enable condition stack, setting up sequence states as it encounters
00000000  2    then.  If the sequence is for a disable, the first state is set up.
00000000  2    If there are more sequence states, an error is returned.  All
00000000  2    sequence states are set up to output the given default signals.  The
00000000  2    last state is set up to output the given last signals.  If too many
00000000  2    sequence states or resources are needed, an error is returned.
00000000  2
00000000  2    HRT_SS uses the following routines:  SET_UP_SS, RT_SS, START_SPEC,
00000000  2    START_GEN, CLOSE_OR_NODE, and SET_FEATURE.
00000000  2
00000000  2    Input:  1) CONDITION, the command array containing the start/stop
00000000  2               specification
00000000  2            2) ID_OFFSET, the offset to which the path I.D. should be
00000000  2               added, ie measurement paths have I.D.s 0-999 ( offset = 0 ),
00000000  2               starts have 1000-1999 ( offset = 1000 ), stops have 2000-
00000000  2               2999 ( offset = 2000 )
00000000  2            3) DEFAULT_SIGS,  a set of default output signals to drive
00000000  2               during all sequence states
00000000  2            4) LAST_SIGS, a set of output signals to drive upon
00000000  2               completion of the last sequence state
00000000  2            5) HEAD, a pointer to the head of the trace specification
00000000  2               list ( cannot be NIL )
00000000  2            6) STATE, a pointer to the state to which this sequence is to
00000000  2               be added after
00000000  2    Output:  1) STATE, a pointer to the last state in the created sequence
00000000  2             2) HRT_CODE, a code specifying what happened:
00000000  2                -8 indicates disable sequence not allowed
00000000  2                -7 indicates out of sequence states
00000000  2                -6 indicates function overflow
00000000  2                -5 indicates out of fast sequencer resources
00000000  2                -4 indicates out of high level hardware resources
00000000  2                -3 indicates out of low level hardware resources
00000000  2                 0 indicates no error:  operation completed
00000000  2                                                                        *)
00000000  2  VAR
00000000  2
00000000  2    I:  S_INT; (* Index into condition array *)
00000002  2
00000002  2    TSPEC:  TRACE_SPEC_PTR; (* Enable/disable trace spec *)
00000006  2
00000006  2    IO:  I_O_REC_PTR; (* Current function generator input/output node *)
0000000A  2
0000000A  2    HL_SET:  HIGH_LEVEL_SET; (* Current set of useable high level
00000298  2                               resources *)
00000298  2
00000298  2  BEGIN (* Procedure HRT_SS *)
00000298  2    HRT_CODE := NO_ERROR;
0000029E  2    I := 0; (* Start at beginning of condition array *)
000002A2  2
000002A2  2    (* Set up all enable/disable sequence states *)
000002A2  2
000002A2  2    IF ID_OFFSET = 1000
000002AE  2      THEN (* Setting up enables *)
000002AE  2        BEGIN (* Create enable spec *)
000002AE  2          START_SPEC ( 0, FALSE, TRUE, TSPEC ); (* Turn on break *)
000002C6  2          HEAD^.NEXT_SPEC := TSPEC;
000002D0  2          TSPEC^.UN_REQUEST := UN_ENABLES;
000002DA  2          (* Now, pretend its a real-time sequence "burst" *)
000002DA  2          RT_SS ( CONDITION, ID_OFFSET, DEFAULT_SIGS, LAST_SIGS,
000002DA  2                  TSPEC^.HW_SPEC, STATE, HRT_CODE )
0000030A  2        END (* Create enable spec *)
0000030E  2      ELSE (* Setting up disables *)
0000030E  2        BEGIN (* Create disable spec *)
0000030E  2          TSPEC := HEAD; (* Use measurement spec *)
00000314  2          (* Don't SEQUENCE after given STATE:  start generator *)
00000314  2          START_GEN ( TSPEC^.HW_SPEC.FUNC_GENERATORS [ X ], 0, 0, STATE,
00000314  2                      IO, HL_SET );
0000033C  2          (* Turn on break because of windows *)
0000033C  2          SET_FEATURE ( ON, TSPEC^.HW_SPEC.FEATURES [ BREAK_ON_STOP ] );
00000352  2          SET_UP_SS ( CONDITION, ID_OFFSET, HL_SET, I, TSPEC^.HW_SPEC,
00000352  2                      IO^, HRT_CODE );
00000382  2          IF HRT_CODE = NO_ERROR
0000038C  2            THEN (* Terms in sequence state set up *)
0000038C  2              IF CONDITION [ I ].OP_CODE = FOLLOWED_BY
```

```
000003A4  2             THEN (* Non-real-time disable sequences not allowed *)
000003A4  2               NRT_CODE := NO_DISABLE_SEQ
000003B0  2             ELSE (* Only one term:  o.k. *)
000003B0  2               CLOSE_OR_MODE ( LAST_SIGS, IO^, NRT_CODE )
000003CC  2       END (* Create disable spec *)
000003CC  2  END; (* Procedure NRT_SS *)
00000000  1
00000000  1
00000000  1
00000000  1
00000000  1
00000000  1  $GLOBPROC ON$
00000000  1  (*
00000000  1                         *******************
00000000  1                         ***** LOAD_SS *****
00000000  1                         *******************
00000000  1                                                                   *)
00000000  1  PROCEDURE LOAD_SS ( VAR TOTAL_MEAS_:  TOTAL_MEAS_REC; HEAD_PTR:
00000000  2                      TRACE_SPEC_PTR; VAR R_CODE:  S_INT );
00000000  2  (*
00000000  2    Procedure LOAD_SS to serve as the pre-processor for the start/
00000000  2    sequence/stop specification.  Procedure creates/modifies trace
00000000  2    specifications to handle the given start/sequence/stop spec.
00000000  2    If the measurement is real-time, the start/stop specification is
00000000  2    added to the existing trace spec if there is room ( otherwise an
00000000  2    error is returned ).  If the measurement is non-real-time, a new
00000000  2    enable spec is created for the enables, while the disables are
00000000  2    still added to the given measurement specification.
00000000  2
00000000  2    Note:  disable sequences are only supported for real-time.  If the
00000000  2           measurement is non-real-time, only one disable term is
00000000  2           allowed!
00000000  2
00000000  2    WARNING:  measurements have path I.D.s of 0 through 999.  Therefore,
00000000  2              enables should have path I.D.s of 1000 through 1999,
00000000  2              disables should have path I.D.s of 2000 through 2999.
00000000  2
00000000  2    LOAD_SS uses the following routines:  RT_SS, NRT_SS, DRIVE_IND,
00000000  2    and RECEIVE_IND.
00000000  2
00000000  2    Input:  1) TOTAL_MEAS_, a structure of pointers to structures
00000000  2               containing all measurement data, ie enables, disables,
00000000  2               configuration, command, and the measurement itself
00000000  2            2) HEAD_PTR, a pointer to the beginning of the trace spec
00000000  2               list ( cannot be NIL )
00000000  2    Output:  1) R_CODE, a return code specifying how the translation
00000000  2                turned out:
00000000  2                 -8 indicates disable sequence not allowed
00000000  2                 -7 indicates out of sequence states
00000000  2                 -6 indicates function overflow
00000000  2                 -5 indicates out of fast sequencer resources
00000000  2                 -4 indicates out of high level hardware resources
00000000  2                 -3 indicates out of low level hardware resources
00000000  2                  0 indicates no error:  load completed
00000000  2                                                                   *)
00000000  2  VAR
00000000  2
00000000  2    DEFAULTS:  OUT_SET_TYPE; (* Set of default output signals *)
00000002  2
00000002  2    FINALS:  OUT_SET_TYPE; (* Set of final output signals *)
00000004  2
00000004  2    STATE:  STATE_REC_PTR; (* Pointer to current state being worked on *)
000003D4  2
000003D4  2  BEGIN (* Procedure LOAD_SS *)
000003D4  2    R_CODE := NO_ERROR; (* "Maybe it will turn out alright, Mable" *)
000003DA  2    STATE := NIL;
000003DE  2    DEFAULTS := [ ];
000003E2  2
000003E2  2    WITH TOTAL_MEAS_ DO
000003EA  2      IF ( HEAD_PTR^.HW_SPEC.FUNC_GENERATORS [ X ].STATE_MACH_PTR <> NIL )
000003EA  2         AND ( ( ( CONFIG_PTR^.REAL_TIME = TRUE ) AND
000003EA  2         ( START_PTR <> NIL ) ) OR ( STOP_PTR <> NIL ) )
0000042A  2      THEN (* Need the X function generator, but already used *)
0000042A  2        R_CODE := OUT_OF_H_RSRCS;
```

```
00000432  2
00000432  2     (* Set up enables *)
00000432  2
00000432  2     IF ( R_CODE = NO_ERROR ) AND ( TOTAL_MEAS_.START_PTR <> NIL )
00000450  2       THEN  (* There is a starting condition *)
00000450  2         IF TOTAL_MEAS_.CONFIG_PTR^.REAL_TIME = TRUE
00000464  2           THEN (* Real-time enables needed *)
00000464  2             BEGIN (* Set up real-time enables and IMB *)
00000464  2               FINALS := DEFAULTS;
0000046A  2               RECEIVE_IMB ( TOTAL_MEAS_.CONFIG_PTR^.ENABLE_IMB.RECEIVE,
0000046A  2                             1000, TOTAL_MEAS_.STOP_PTR, DEFAULTS, FINALS,
0000046A  2                             HEAD_PTR^.HW_SPEC, STATE, R_CODE );
0000049E  2               FINALS := FINALS + [ START_QUAL ];
000004A4  2               IF R_CODE = NO_ERROR
000004AE  2                 THEN (* Receiving IMB set up *)
000004AE  2                   RT_SS ( TOTAL_MEAS_.START_PTR^, 1000, DEFAULTS, FINALS,
000004AE  2                           HEAD_PTR^.HW_SPEC, STATE, R_CODE );
000004DE  2               IF R_CODE = NO_ERROR
000004E8  2                 THEN (* Enables set up *)
000004E8  2                   DRIVE_IMB ( TOTAL_MEAS_.CONFIG_PTR^.ENABLE_IMB.DRIVE,
000004E8  2                               1000, TOTAL_MEAS_.STOP_PTR, DEFAULTS,
000004E8  2                               FINALS, HEAD_PTR^.HW_SPEC, STATE, R_CODE )
00000520  2             END (* Set up real-time enables and IMB *)
00000524  2           ELSE (* Non-real-time enables needed *)
00000524  2             BEGIN (* Set up non-real-time enables *)
00000524  2               FINALS := [ START_QUAL, STOP ];
0000052A  2               NRT_SS ( TOTAL_MEAS_.START_PTR^, 1000, DEFAULTS, FINALS,
0000052A  2                        HEAD_PTR, STATE, R_CODE )
00000556  2             END; (* Set up non-real-time enables *)
00000556  2
00000556  2     (* Set up disables *)
00000556  2
00000556  2     IF ( R_CODE = NO_ERROR ) AND ( TOTAL_MEAS_.STOP_PTR <> NIL )
00000576  2       THEN  (* There is a stopping condition *)
00000576  2         IF TOTAL_MEAS_.CONFIG_PTR^.REAL_TIME = TRUE
00000586  2           THEN (* Real-time disables needed *)
00000586  2             BEGIN (* Set up real-time disables and IMB *)
00000586  2               FINALS := DEFAULTS;
0000058C  2               RECEIVE_IMB ( TOTAL_MEAS_.CONFIG_PTR^.DISABLE_IMB.RECEIVE,
0000058C  2                             2000, TOTAL_MEAS_.STOP_PTR, DEFAULTS, FINALS,
0000058C  2                             HEAD_PTR^.HW_SPEC, STATE, R_CODE );
000005C0  2               FINALS := FINALS + [ SEQUENCE_STOP, STOP ];
000005C6  2               IF R_CODE = NO_ERROR
000005D0  2                 THEN (* Receiving IMB set up *)
000005D0  2                   RT_SS ( TOTAL_MEAS_.STOP_PTR^, 2000, DEFAULTS, FINALS,
000005D0  2                           HEAD_PTR^.HW_SPEC, STATE, R_CODE );
00000602  2               IF R_CODE = NO_ERROR
0000060C  2                 THEN (* Disables set up *)
0000060C  2                   DRIVE_IMB ( TOTAL_MEAS_.CONFIG_PTR^.DISABLE_IMB.DRIVE,
0000060C  2                               2000, TOTAL_MEAS_.STOP_PTR, DEFAULTS,
0000060C  2                               FINALS, HEAD_PTR^.HW_SPEC, STATE, R_CODE )
00000644  2             END (* Set up real-time disables and IMB *)
00000648  2           ELSE (* Non-real-time disables needed *)
00000648  2             BEGIN (* Set up non-real-time disables *)
00000648  2               FINALS := [ SEQUENCE_STOP, STOP ];
0000064E  2               NRT_SS ( TOTAL_MEAS_.STOP_PTR^, 2000, DEFAULTS, FINALS,
0000064E  2                        HEAD_PTR, STATE, R_CODE )
0000067C  2             END (* Set up non-real-time disables *)
0000067C  2  END; (* Procedure LOAD_SS *)
00000000  1  $GLOBPROC OFF$
00000000  1
00000000  1
00000000  1
00000000  1
00000000  1
00000000  1  (*
00000000  1                           *********************
00000000  1                           ***** UNLOAD_SS *****
00000000  1                           *********************
00000000  1                                                                        *)
00000000  1  $GLOBPROC ON$
00000000  1  PROCEDURE UNLOAD_SS ( VAR TOTAL_MEAS_:  TOTAL_MEAS_REC; VAR SYMS_:
00000000  2                        SYM_DESCRIPS; VAR FLAGS_:  FLAG_ARRAY_TYPE; MAC_:
00000000  2                        S_INT; VAR SPEC_:  HW_SPEC_REC; VAR UNLD_COUNT
00000000  2                        R_CODE:  S_INT );
```

```
00000684  2  (*
00000684  2    Procedure UNLOAD_SS to serve as the post-processor for the start/
00000684  2    sequence/stop specification.  It simply returns a no error indication
00000684  2    meaning the enable occurred.  This is sufficient because if this
00000684  2    procedure is called, it means the enable condition occurred.
00000684  2
00000684  2    Note:  this trivial procedure no longer requires all the above
00000684  2           parameters, but it once did when enables could be non-real-time
00000684  2           and we attempted to store enables.  Since this is no longer
00000684  2           the case, the once complicated code is simple, but the
00000684  2           parameters remain.
00000684  2
00000684  2    Input:  1) TOTAL_MEAS_, a structure of pointers to structures
00000684  2               containing all measurement data, ie enables, disables,
00000684  2               configuration, command, and the measurement itself
00000684  2            2) SYMS_, a list of all unique symbols involved in the
00000684  2               measurement
00000684  2            3) FLAGS_, the flag word data structure containing the
00000684  2               most recently read hardware flags
00000684  2            4) MAC_, the memory address counter off the memory board
00000684  2               obtained before unloading began
00000684  2            5) SPEC_, the current hardware specification
00000684  2            6) UNLD COUNT, the previous # of states unloaded and
00000684  2               shipped out to the trace file
00000684  2    Output:  1) SPEC_, the possibly modified hardware specification
00000684  2             2) UNLD_COUNT, the updated # of states unloaded and output
00000684  2                to the trace file
00000684  2             3) R_CODE, the return code indicating how things turned out:
00000684  2                  0 indicates no error ( enable found )
00000684  2                                                                          *)
00000684  2  BEGIN (* Procedure UNLOAD_SS *)
00000684  2    R_CODE := NO_ERROR (* By default, if called, the enable occurred! *)
0000068A  2  END; (* Procedure UNLOAD_SS *)
00000000  1  $GLOBPROC OFF$
00000000  1  .

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic Controller:  Start/Seq/Stop IMB"
00000000  1  PROGRAM SS_IMB;
00000000  1  (*
00000000  1  ********************************** SS_IMB **********************************
00000000  1    SS_IMB is the module containing all the necessary routines for start/
00000000  1    sequence/stop to do things on the IMB bus.  Routines for driving/
00000000  1    receiving signals on the bus are all located in this module.  SS_IMB
00000000  1    is processor independent.
00000000  1    Author:  Kip Fulghum
00000000  1    Date:  9-13-84  Revised:  9-13-84
00000000  1  ****************************************************************************
00000000  1
00000000  1    SS_IMB contains the following routines:
00000000  1    -Global procedure DRIVE_IMB sets up driving a signal on IMB.
00000000  1    -Global procedure RECEIVE_IMB sets up receiving a signal on IMB.
00000000  1
00000000  1    In addition, the following external routines are used:
00000000  1    SEQUENCE, ADD_HPATH, ADD_OUTPUTS, CLOSE_IO_NODE, and SET_FEATURE.
00000000  1                                                                     *)
00000000  1  (*
00000000  1                         ***************************
00000000  1                         ***** Include Files *****
00000000  1                         ***************************
00000000  1                                                                     *)
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE ICMD_DATA:SODAMON
00000000  1
```

```
%CALL_ABS_LONGS
(*
                              *********************
                              ***** SEQUENCE *****
                              *********************
                                                                        *)
PROCEDURE SEQUENCE ( VAR GENERATOR:  FUNC_RESOURCE; VAR STATE_PTR:
                       STATE_REC_PTR; VAR IO_PTR:  I_O_REC_PTR; VAR
                       HIGH_SET:  HIGH_LEVEL_SET; VAR SEQ_CODE:  S_INT );
                       EXTERNAL;
(*
  Procedure SEQUENCE to sequence a new state after the given state.
  Provided as a Pascal external.
                                                                        *)




(*
                              *********************
                              ***** ADD_MPATH *****
                              *********************
                                                                        *)
PROCEDURE ADD_MPATH ( MISC_IDS:  MISC_DRIVERS; VAR POS_HL_SET:
                       HIGH_LIVEL_SET; VAR MISC_ARRAY:  MISC_ARRAY_TYPE,
                       VAR HI_ARRAY:  HL_ARRAY_TYPE; VAR IO:  I_O_REC;
                       VAR CODE:  S_INT ); EXTERNAL,
(*
  Procedure ADD_MPATH to create and add a misc. signal to high level
  resource path to the given function generator I/O node's input
  function description.  Provided as a Pascal external.
                                                                        *)





(*
                              *************************
                              ***** ADD_OUTPUTS *****
                              *************************
                                                                        *)
PROCEDURE ADD_OUTPUTS ( OUTPUT_SET:  OUT_SET_TYPE; VAR IO:  I_O_REC );
                         EXTERNAL.
(*
  Procedure AOD_OUTPUTS to add a set of output signals to the given
  function generator I/O node's output function description.  Provided
  as a Pascal external.
                                                                        *)






(*
                            **************************
                            ***** CLOSE_IO_NODE *****
                            **************************
                                                                        *)
PROCEDURE CLOSE_IO_NODE ( FINAL_OUTS:  OUT_SET_TYPE; VAR IO:  I_O_REC;
                             VAR CLOSE_CODE:  S_INT ); EXTERNAL;
(*
  Procedure CLOSE_IO_NODE to close out a function generator I/O node.
  Provided as a Pascal external.
                                                                        *)
```

```
00000000 1
00000000 1  (*
00000000 1                          ***********************
00000000 1                          ***** SET_FEATURE *****
00000000 1                          ***********************
00000000 1                                                                   *)
00000000 1  PROCEDURE SET_FEATURE ( ON_OFF:  CONDITION_TYPE; VAR FEAT_SIG:
00000000 2                          FEATURE_REC ); EXTERNAL;
00000000 1  (*
00000000 1    Procedure SET_FEATURE to turn on/off a feature signal.  Provided as
00000000 1    a Pascal external.
00000000 1                                                                   *)
00000000 1
00000000 1
00000000 1
00000000 1
00000000 1
00000000 1  (*
00000000 1                          **********************
00000000 1                          ***** DRIVE_IMB *****
00000000 1                          **********************
00000000 1                                                                   *)
00000000 1  $GLOBPROC ON$
00000000 1  PROCEDURE DRIVE_IMB ( LINE:  IMB_LINES; ID_OFFSET:  S_INT; STOP:
00000000 2                        CMD_ARRAY_PTR; VAR DEFAULT_SIGS, LAST_SIGS:
00000000 2                        OUT_SET_TYPE; VAR SPEC:  HW_SPEC_REC; VAR STATE:
00000000 2                        STATE_REC_PTR; VAR IMB_CODE:  S_INT );
00000000 2  (*
00000000 2    Procedure DRIVE_IMB to set up driving a signal on IMB.  Procedure
00000000 2    currently supports the driving the trigger enable line, either on
00000000 2    enable or disable.  If trigger enable is driven, the procedure puts
00000000 2    us on the bus.  The previous state's first I/O node is modified to
00000000 2    drive the signal, and the given signal sets are updated to make
00000000 2    sure trigger enable will be driven in any future sequence states.
00000000 2    If there are no disable terms to make sure trigger enable will be
00000000 2    driven in the future, a sequence state to do this is added.
00000000 2
00000000 2    DRIVE_IMB uses the following routines:  SEQUENCE, ADD_OUTPUTS,
00000000 2    CLOSE_IO_NODE, and SET_FEATURE.
00000000 2
00000000 2    Input:  1) LINE, the IMB line to drive ( currently, only trigger
00000000 2               enable is supported )
00000000 2            2) ID_OFFSET, the offset to which the path I.D. should be
00000000 2               added, ie measurement paths have I.D.s 0-999 ( offset = 0 ),
00000000 2               starts have 1000-1999 ( offset = 1000 ), stops have 2000-
00000000 2               2999 ( offset = 2000 )
00000000 2            3) STOP, a pointer to the disable condition
00000000 2            4) DEFAULT_SIGS,  a set of default output signals to drive
00000000 2               during all sequence states
00000000 2            5) LAST_SIGS, a set of output signals to drive upon
00000000 2               completion of the last sequence state
00000000 2            6) SPEC, the hardware specification to which the enable/
00000000 2               disable sequence is to be added
00000000 2            7) STATE, a pointer to the state to which this sequence is to
00000000 2               be added after
00000000 2    Output:  1) DEFAULT_SIGS, the updated set of default output signals
00000000 2             2) LAST_SIGS, the updated set of last output signals
00000000 2             3) SPEC, the modified hardware specification
00000000 2             4) STATE, a pointer to the last state in the created sequence
00000000 2             5) IMB_CODE, a code specifying what happened:
00000000 2                 -7 indicates out of sequence states
00000000 2                  0 indicates no error:  operation completed
00000000 2                                                                   *)
00000000 2  VAR
00000000 2
00000000 2    IO:  I_O_REC_PTR; (* Current function generator input/output node *)
00000004 2
00000004 2    HL_SET:  HIGH_LEVEL_SET; (* Current set of useable high level
00000004 2                                 resources *)
00000004 2
00000004 2  BEGIN (* Procedure DRIVE_IMB *)
00000004 2    IMB_CODE := NO_ERROR;
0000000A 2
0000000A 2    (* Set up driving trigger enable *)
```

```
0000000A 2
0000000A 2   IF LINE = TRIGGER_ENABLE
00000016 2     THEN (* Driving trigger enable *)
00000016 2       BEGIN (* Set it up *)
00000016 2         (* Put us on the bus *)
00000016 2         SET_FEATURE ( ON, SPEC.FEATURES [ RECEIVE_LNE ] );
0000002C 2         SET_FEATURE ( ON, SPEC.FEATURES [ DRIVE_LTE ] );
00000042 2         IF STATE^.I_O_PTR <> NIL
00000050 2           THEN (* Add search to first I/O node of last state *)
00000050 2             ADD_OUTPUTS ( [ SEARCH ], STATE^.I_O_PTR^ );
00000068 2         (* Make sure it's driven from now on *)
00000068 2         DEFAULT_SIGS := DEFAULT_SIGS + [ SEARCH ];
00000074 2         LAST_SIGS := LAST_SIGS + [ SEARCH ];
00000080 2         IF STOP = NIL
00000088 2           THEN (* No disables *)
00000088 2             BEGIN (* Create final state for driving *)
00000088 2               SEQUENCE ( SPEC.FUNC_GENERATORS [ X ], STATE, IO, HL_SET,
00000089 2                          IMB_CODE );
00000092 2               IF IMB_CODE = NO_ERROR
000000BC 2                 THEN (* Sequence state added *)
000000BC 2                   CLOSE_IO_NODE ( LAST_SIGS, IO^, IMB_CODE )
000000DA 2             END (* Create final state for driving *)
000000DA 2       END (* Set it up *)
000000DA 2 END; (* Procedure DRIVE_IMB *)
00000000 1 $GLOBPROC OFF$
00000000 1
00000000 1
00000000 1
00000000 1
00000000 1
00000000 1 (*
00000000 1                         ************************
00000000 1                         ***** RECEIVE_IMB *****
00000000 1                         ************************
00000000 1                                                                       *)
00000000 1 $GLOBPROC ON$
00000000 1 PROCEDURE RECEIVE_IMB ( LINE:  IMB_LINES; IO_OFFSET:  S_INT; STOP:
00000000 2                         CMD_ARRAY_PTR; VAR DEFAULT_SIGS, LAST_SIGS:
00000000 2                         OUT_SET_TYPE; VAR SPEC:  HW_SPEC_REC; VAR STATE:
00000000 2                         STATE_REC_PTR; VAR IMB_CODE:  S_INT );
00000000 2 (*
00000000 2   Procedure RECEIVE_IMB to set up receiving a signal on IMB.  Procedure
00000000 2   currently supports the receiving the trigger enable line, either on
00000000 2   enable or disable.  If trigger enable is received, the procedure puts
00000000 2   us on the bus.  After that, a new state is created to look for
00000000 2   trigger enable.  This state is linked in at the end of the list.
00000000 2
00000000 2   RECEIVE_IMB uses the following routines:  SEQUENCE, ADD_MPATH,
00000000 2   CLOSE_IO_NODE, and SET_FEATURE.
00000000 2
00000000 2   Input:  1) LINE, the IMB line to receive ( currently, only trigger
00000000 2              enable is supported )
00000000 2           2) IO_OFFSET, the offset to which the path I.D. should be
00000000 2              added, ie measurement paths have I.D.s 0-999 ( offset = 0 ),
00000000 2              starts have 1000-1999 ( offset = 1000 ), stops have 2000-
00000000 2              2999 ( offset = 2000 )
00000000 2           3) STOP, a pointer to the disable condition
00000000 2           4) DEFAULT_SIGS,  a set of default output signals to drive
00000000 2              during all sequence states
00000000 2           5) LAST_SIGS, a set of output signals to drive upon
00000000 2              completion of the last sequence state
00000000 2           6) SPEC, the hardware specification to which the enable/
00000000 2              disable sequence is to be added
00000000 2           7) STATE, a pointer to the state to which this sequence is to
00000000 2              be added after
00000000 2   Output:  1) DEFAULT_SIGS, the updated set of default output signals
00000000 2            2) LAST_SIGS, the updated set of last output signals
00000000 2            3) SPEC, the modified hardware specification
00000000 2            4) STATE, a pointer to the last state in the created sequence
00000000 2            5) IMB_CODE, a code specifying what happened:
00000000 2                -7 indicates out of sequence states
00000000 2                 0 indicates no error:  operation completed
00000000 2                                                                       *)
00000000 2 VAR
```

```
00000000  2
00000000  2    IO:  I_O_REC_PTR; (* Current function generator input/output node *)
00000004  2
00000004  2    HL_SET:  HIGH_LEVEL_SET; (* Current set of useable high level
000000E2  2                                 resources *)
000000E2  2
000000E2  2  BEGIN (* Procedure RECEIVE_IMB *)
000000E2  2    IMB_CODE := NO ERROR;
000000E8  2
000000E8  2    (* Set up receiving trigger enable *)
000000E8  2
000000E8  2    IF LINE = TRIGGER_ENABLE
000000F4  2      THEN (* Receiving trigger enable *)
000000F4  2        BEGIN (* Set it up *)
000000F4  2          (* Put us on the bus *)
000000F4  2          SET_FEATURE ( ON, SPEC.FEATURES [ RECEIVE_LNE ] );
0000010A  2          SET_FEATURE ( ON, SPEC.FEATURES [ RECEIVE_LTE ] );
00000120  2          (* Add state for receiving signal *)
00000120  2          SEQUENCE ( SPEC.FUNC_GENERATORS [ X ], STATE, IO, HL_SET,
00000120  2                     IMB_CODE );
0000014A  2          IF IMB_CODE = NO_ERROR
00000154  2            THEN (* Sequence state added *)
00000154  2              ADD_MPATH ( EXT_STIM, HL_SET, SPEC.MISC_SIGNALS,
00000154  2                          SPEC.HIGH_LEVELS, IO^, IMB_CODE );
00000180  2          IF IMB_CODE = NO_ERROR
0000018A  2            THEN (* Sequence state set up *)
0000018A  2              CLOSE_IO_NODE ( LAST_SIGS, IO^, IMB_CODE )
000001A8  2        END (* Set it up *)
000001A8  2  END; (* Procedure RECEIVE_IMB *)
00000000  1  $GLOBPROC OFF$
00000000  1  .

508: Warning: field or entry alignment; record or array comparisons may not work

End of compilation, number of errors=     0
00000000  1  "68000" PREPROCESS
00000000  1  $EXTENSIONS ON$
00000000  1  $TITLE "Soda Dynamic Controller:  Don't Care Trace"
00000000  1  PROGRAM TRACE_XXX;
00000000  1  (*
00000000  1  ****************************** TRACE_XXX ******************************
00000000  1    TRACE_XXX is the module containing the routines for the load pre-
00000000  1    processor and the unload post-processor for the don't care trace
00000000  1    measurement.  For pre-processing, the user measurement data structure
00000000  1    is translated to reflect a don't care trace.  For post-processing,
00000000  1    the measurement data is unloaded from the hardware and the current
00000000  1    trace file is updated with all measurement data.
00000000  1    Author:  Kip Fulgnum
00000000  1    Date:  8-11-83  Revised:  1-9-85
00000000  1  ***********************************************************************
00000000  1
00000000  1    TRACE_XXX contains the following routines:
00000000  1    -Global procedure LOAD_TX is the pre-processor for the don't care
00000000  1     trace measurement.  It loads the appropriate data structures with the
00000000  1     necessary information to create a don't care trace when loaded into
00000000  1     the hardware.
00000000  1    -Global procedure UNLOAD_TX is the post-processor for the don't care
00000000  1     trace measurement.  It unloads the hardware one sextuplet at
00000000  1     a time and creates valid trace file data records.
00000000  1
00000000  1    In addition, TRACE_XXX uses the following external routines:
00000000  1    START_GEN, ASSIGN_LL_RSRC, CLOSE_IO_LIST,
00000000  1    HOW_MUCH_DATA, GET_DATA, WRITE_ANLYS_REC, UNLOAD_MSG, UNLOAD_DONE,
00000000  1    GET_VALUE_MASK, and GET_BUS_MASK.
00000000  1                                                                       *)
00000000  1  (*
00000000  1                           **************************
00000000  1                           ***** Include Files *****
00000000  1                           **************************
00000000  1                                                                       *)
00000000  1
00000000  1  #INCLUDE ER_CONST:SS_DYN
00000000  1
00000000  1  #INCLUDE COM_TYPES:SS_DYN
```

```
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICND_DATA:SODAMON
00000000  1
00000000  1
00000000  1
00000000  1
00000000  1
00000000  1  $CALL_ABS_LONGS
00000000  1  (*
00000000  1                          **********************
00000000  1                          ***** START_GEN *****
00000000  1                          **********************
00000000  1                                                                  *)
00000000  1  PROCEDURE START_GEN ( VAR GENERATOR:  FUNC_RESOURCE; START_STATE,
00000000  2                       NEXT_STATE:  S_INT; VAR STATE_PTR:  STATE_REC_PTR;
00000000  2                       VAR IO_PTR:  I_O_REC_PTR; VAR HIGH_SET:
00000000  2                       HIGH_LEVEL_SET ); EXTERNAL;
00000000  1  (*
00000000  1    Procedure START_GEN to prepare a function generator for use.
00000000  1    Provided as a Pascal external.
00000000  1                                                                  *)
00000000  1
00000000  1
00000000  1
00000000  1
00000000  1
00000000  1  (*
00000000  1                        ***************************
00000000  1                        ***** ASSIGN_LL_RSRC *****
00000000  1                        ***************************
00000000  1                                                                  *)
00000000  1  FUNCTION ASSIGN_LL_RSRC ( RSRC_TYPE:  LL_TYPE; RSRC_ID:  S_INT;
00000000  2                           LO_VALUE, LO_MASK, HI_VALUE, HI_MASK:
00000000  2                           L_INT; VAR LL_ARRAY:  LL_ARRAY_TYPE ):  S_INT;
00000000  2                           EXTERNAL;
00000000  1  (*
00000000  1    Function ASSIGN_LL_RSRC to allocate a low level resource from those
00000000  1    available for use by the caller.  Provided as a Pascal external.
00000000  1                                                                  *)
00000000  1
00000000  1
00000000  1
00000000  1
00000000  1
00000000  1  (*
00000000  1                        **************************
00000000  1                        ***** CLOSE_IO_LIST *****
00000000  1                        **************************
00000000  1                                                                  *)
00000000  1  PROCEDURE CLOSE_IO_LIST ( DC_STATE:  S_INT; DC_OUTS:  OUT_SET_TYPE;
00000000  2                           VAR LAST_IO:  I_O_REC ); EXTERNAL;
00000000  1  (*
00000000  1    Procedure CLOSE_IO_LIST to close out a function generator I/O list
00000000  1    with a don't care I/O node.  Provided as a Pascal external.
00000000  1                                                                  *)
00000000  1
00000000  1
00000000  1
00000000  1
00000000  1
00000000  1  (*
00000000  1                        *************************
00000000  1                        ***** HOW_MUCH_DATA *****
00000000  1                        *************************
00000000  1                                                                  *)
00000000  1  PROCEDURE HOW_MUCH_DATA ( VAR FLAGS:  FLAG_ARRAY_TYPE; VAR FEAT_ARRAY:
00000000  2                           FEAT_ARRAY_TYPE; START_MAC, END_MAC:  S_INT;
00000000  2                           VAR START_STATE, NUM_STATES:  S_INT );
00000000  2                           EXTERNAL;
00000000  1  (*
```

```
00000000 1    Procedure HOW_MUCH_DATA to determine how much data was captured and
00000000 1    starting from where.  Provided as a Pascal external.
00000000 1                                                                     *)
00000000 1
00000000 1
00000000 1
00000000 1
00000000 1
00000000 1  (*
00000000 1                         *********************
00000000 1                         ***** GET_DATA *****
00000000 1                         *********************
00000000 1                                                                     *)
00000000 1  PROCEDURE GET_DATA ( START_STATE, UN_COUNTER:  S_INT; VAR FEAT_ARRAY:
00000000 2                   FEAT_ARRAY_TYPE; VAR BASE:  DOUBLE_ARRAY; VAR
00000000 2                   SEXTET:  SEXTET_REC_TYPE ); EXTERNAL;
00000000 1  (*
00000000 1    Procedure GET_DATA to retrieve a sextet worth of data out of
00000000 1    acquisition memory, translate the emulation data to generic data,
00000000 1    and decode the captured grey-code count.  Provided as a Pascal
00000000 1    external.
00000000 1                                                                     *)
00000000 1
00000000 1
00000000 1
00000000 1
00000000 1
00000000 1  (*
00000000 1                      ****************************
00000000 1                      ***** WRITE_ANLYS_REC *****
00000000 1                      ****************************
00000000 1                                                                     *)
00000000 1  PROCEDURE WRITE_ANLYS_REC ( D_TYPE, INDEX:  S_INT; N_FIELD:  L_INT; VAR
00000000 2                          SEX_REC:  SEXTET_REC_TYPE; VAR REC_COUNT,
00000000 2                          FNGR_CODE:  S_INT ); EXTERNAL;
00000000 1  (*
00000000 1    Procedure WRITE_ANLYS_REC to create and write a trace file analysis
00000000 1    record to the disc.  Provided as a Pascal external.
00000000 1                                                                     *)
00000000 1
00000000 1
00000000 1
00000000 1
00000000 1
00000000 1  (*
00000000 1                         ***********************
00000000 1                         ***** UNLOAD_MSG *****
00000000 1                         ***********************
00000000 1                                                                     *)
00000000 1  PROCEDURE UNLOAD_MSG ( STATE:  S_INT ); EXTERNAL;
00000000 1  (*
00000000 1    Procedure UNLOAD_MSG to update the current unload message with the
00000000 1    given count.  Provided as a Pascal external.
00000000 1                                                                     *)
00000000 1
00000000 1
00000000 1
00000000 1
00000000 1
00000000 1  (*
00000000 1                        ************************
00000000 1                        ***** UNLOAD_DONE *****
00000000 1                        ************************
00000000 1
00000000 1  FUNCTION UNLOAD_DONE ( COUNT:  S_INT ):  BOOLEAN; EXTERNAL;
00000000 1  (*
00000000 1    Function UNLOAD_DONE to determine when the unload sequence is done.
00000000 1    Provided as a Pascal external.
00000000 1                                                                     *)
00000000 1
00000000 1
00000000 1
00000000 1
00000000 1
```

```
00000000  1  (*
00000000  1                          **************************
00000000  1                          ***** GET_VALUE_MASK *****
00000000  1                          **************************
00000000  1                                                                   *)
00000000  1  PROCEDURE GET_VALUE_MASK ( ACCESS:  S_INT; VAR VALUE, MASK:  L_INT );
00000000  2                            EXTERNAL;
00000000  1  (*
00000000  1    Procedure GET_VALUE_MASK to determine the appropriate value and
00000000  1    mask for tracing different processor status, ie reads, writes, etc.
00000000  1    Provided as a Pascal external.
00000000  1                                                                   *)
00000000  1
00000000  1
00000000  1
00000000  1
00000000  1
00000000  1  (*
00000000  1                          ************************
00000000  1                          ***** GET_BUS_MASK *****
00000000  1                          ************************
00000000  1                                                                   *)
00000000  1  FUNCTION GET_BUS_MASK ( BUS:  S_INT ):  L_INT; EXTERNAL;
00000000  1  (*
00000000  1    Function GET_BUS_MASK to return the processor specific mask containing
00000000  1    all 1s for all bits on the given bus.  Provided as a Pascal external.
00000000  1                                                                   *)
00000000  1
00000000  1
00000000  1
00000000  1
00000000  1
00000000  1  (*
00000000  1                            *******************
00000000  1                            ***** LOAD_TX *****
00000000  1                            *******************
00000000  1                                                                   *)
00000000  1  $GLOBPROC ON$
00000000  1  PROCEDURE LOAD_TX ( VAR MEAS_:  CMD_DATA_ARRAY; VAR SYMS_:
00000000  2                      SYM_DESCRIPS; VAR SPEC_:  HW_SPEC_REC; VAR R_CODE:
00000000  2                      S_INT );
00000000  2  (*
00000000  2    Procedure LOAD_TX is the pre-processor for the don't care trace
00000000  2    measurement.  It loads the appropriate hardware data structures with
00000000  2    the necessary information to create a don't care trace when
00000000  2    loaded into the hardware.  Procedure simply loads a function generator
00000000  2    to store all states.
00000000  2
00000000  2    LOAD_TX uses the following routines:  START_GEN, ASSIGN_LL_RSRC,
00000000  2    CLOSE_IO_LIST, GET_VALUE_MASK, and GET_BUS_MASK.
00000000  2
00000000  2    Input:  1) MEAS_, the input structure to the loader indicating
00000000  2               what the measurement is
00000000  2            2) SYMS_, a list of all unique symbols involved in the
00000000  2               measurement
00000000  2            3) SPEC_, the initialized hardware specification structure
00000000  2    Output:  1) SPEC_, the completed hardware record containing
00000000  2                specifications for usage of the:
00000000  2              a) low level resources,
00000000  2              b) high level resources,
00000000  2              c) fast sequencer,
00000000  2              d) micro-code occurance counters,
00000000  2              e) function generators,
00000000  2              f) misc. signals,
00000000  2              g) occurance counters,
00000000  2              h) extraneous features
00000000  2             2) R_CODE, a code specifying how the load turned out:
00000000  2                  0 indicates no error:  load completed
00000000  2                                                                   *)
00000000  2  VAR
00000000  2
00000000  2    OP_VALUE:  L_INT; (* Processor value for opcode fetch *)
00000004  2
00000004  2    OP_MASK:  L_INT; (* Processor mask for opcode fetch *)
```

```
00000008  2
00000008  2    ADDR_MASK:  L_INT; (* Processor mask for address bus *)
0000000C  2
0000000C  2    NEXT_LL:  S_INT; (* Next assigned low level resource *)
0000000E  2
0000000E  2    STATE:  STATE_REC_PTR; (* Current function generator state node *)
00000012  2
00000012  2    IO:  I_O_REC_PTR; (* Current function generator input/output node *)
00000016  2
00000016  2    HL_SET:  HIGH_LEVEL_SET; (* Current set of useable high level
00000004  2                                  resources *)
00000004  2
00000004  2  BEGIN (* Procedure LOAD_TX *)
00000004  2    R_CODE := NO_ERROR; (* Be optimistic *)
0000000A  2
0000000A  2    (* Start state machine:  use Y generator *)
0000000A  2
0000000A  2    START_GEN ( SPEC_.FUNC_GENERATORS [ Y ], 0, 0, STATE, IO, HL_SET );
00000032  2
00000032  2    (* Get processor specific values/masks *)
00000032  2
00000032  2    GET_VALUE_MASK ( OPCODE, OP_VALUE, OP_MASK );
0000004A  2    ADDR_MASK := GET_BUS_MASK ( 0 );
00000058  2
00000058  2    (* Turn on opcode resource:  the only one we need *)
00000058  2
00000058  2    NEXT_LL := ASSIGN_LL_RSRC ( OPCODE_EQUATE, 999, OP_VALUE+ADDR_MASK,
00000058  2                                OP_MASK, 0, 0, SPEC_.LOW_LEVELS );
00000088  2
00000088  2    (* Take a shallow breath:  we're going down for a short, short time *)
00000088  2
00000088  2    CLOSE_IO_LIST ( 0, [ COUNT, STORE ], IO^ )
0000009C  2  END; (* Procedure LOAD_TX *)
00000000  1  $GLOBPROC OFF$
00000000  1
00000000  1
00000000  1
00000000  1
00000000  1
00000000  1  (*
00000000  1                        **********************
00000000  1                        ***** UNLOAD_TX *****
00000000  1                        **********************
00000000  1                                                                  *)
00000000  1  $GLOBPROC ON$
00000000  1  PROCEDURE UNLOAD_TX ( VAR MEAS_:  CMD_DATA_ARRAY; VAR SYMS_:
00000000  2                        SYM_DESCRIPS; VAR FLAGS_:  FLAG_ARRAY_TYPE; MAC_:
00000000  2                        S_INT; VAR SPEC_:  HW_SPEC_REC; VAR UNLD_COUNT,
00000000  2                        R_CODE:  S_INT );
00000000  2  (*
00000000  2    Procedure UNLOAD_TX is the post-processor for the don't care trace
00000000  2    measurement.  It unloads the hardware one sextuplet at a time
00000000  2    and creates valid trace file data records.
00000000  2
00000000  2    UNLOAD_TX uses the following routines:  HOW_MUCH_DATA, GET_DATA,
00000000  2    WRITE_ANLYS_REC, UNLOAD_MSG, and UNLOAD_DONE.
00000000  2
00000000  2    Input:  1) MEAS_, the structure describing the measurement at a high
00000000  2               level
00000000* 2            2) SYMS_, a list of all unique symbols involved in the
00000000  2               measurement
00000000  2            3) FLAGS_, the flag word data structure containing the
00000000  2               most recently read hardware flags
00000000  2            4) MAC_, the memory address counter off the memory board
00000000  2               obtained before unloading began
00000000  2            5) SPEC_, the hardware specification which captured the
00000000  2               data
00000000  2            6) UNLD_COUNT, the previous # of states unloaded and
00000000  2               shipped out to the trace file
00000000  2    Output:  1) SPEC_, the possibly modified hardware specification
00000000  2                structure
00000000  2             2) UNLD_COUNT, the updated # of states unloaded and output
00000000  2                to the trace file
00000000  2             3) R_CODE, the return code indicating how things turned out:
```

```
00000000  2                  0 indicates no error:  data records completed
00000000  2                  3 indicates file not found:  invalid DCB ( should never
00000000  2                    happen )
00000000  2                  5 indicates no free pages available
00000000  2                  7 indicates file corrupt
00000000  2                                                                      *)
00000000  2  VAR
00000000  2
00000000  2    START_LOCATION:  S_INT; (* First location to unload *)
00000002  2
00000002  2    NUM_LOCATIONS:  S_INT; (* Number of locations to unload *)
00000004  2
00000004  2    MEM_COUNT:  S_INT; (* Memory unload count *)
00000006  2
00000006  2    CURRENT_BASE:  DOUBLE_ARRAY; (* Storage for current base count *)
0000000E  2
0000000E  2    SEXTET_REC:  SEXTET_REC_TYPE; (* Storage for unloaded hw sextet *)
000000A4  2
000000A4  2  BEGIN (* Procedure UNLOAD_TX *)
000000A4  2    R_CODE := NO_ERROR; (* Be optimistic *)
000000AA  2
000000AA  2    (* Figure out how much to unload *)
000000AA  2
000000AA  2    HOW_MUCH_DATA ( FLAGS_, SPEC_.FEATURES, SPEC_.START_MAC, MAC_,
000000AA  2                    START_LOCATION, NUM_LOCATIONS );
000000D4  2
000000D4  2    (* Now, unload it all *)
000000D4  2
000000D4  2    MEM_COUNT := 1;
000000DA  2    WHILE ( MEM_COUNT <= NUM_LOCATIONS ) AND ( R_CODE = NO_ERROR ) AND
000000DA  2          ( UNLOAD_DONE ( UNLD_COUNT ) = FALSE ) DO
00000114  2      BEGIN (* Unload a sextet and create an equivalent data record *)
00000114  2        UNLOAD_MSG ( MEM_COUNT );
0000011E  2
0000011E  2        (* Pull a sextet out of the hardware *)
0000011E  2
0000011E  2        GET_DATA ( START_LOCATION, MEM_COUNT, SPEC_.FEATURES,
0000011E  2                   CURRENT_BASE, SEXTET_REC );
00000142  2
00000142  2        (* Ship it *)
00000142  2
00000142  2        WRITE_ANLYS_REC ( STATEMENTS, 0, 0, SEXTET_REC, UNLD_COUNT,
00000142  2                          R_CODE );
00000166  2        MEM_COUNT := MEM_COUNT + 1
0000016A  2      END (* Unload a sextet and create an equivalent data record *)
0000016E  2  END; (* Procedure UNLOAD_TX *)
00000000  1  $GLOBPROC OFF$
00000000  1

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic Controller:  Trace Break"
00000000  1  PROGRAM TRACE_BRK;
00000000  1  (*
00000000  1  ******************************* TRACE_BRK *******************************
00000000  1    TRACE_BRK is the module containing the routines for the load pre-
00000000  1    processor and the unload post-processor for the trace break
00000000  1    measurement.  For pre-processing, the user measurement data structure
00000000  1    is translated to reflect a trace break.  For post-processing, the
00000000  1    measurement data is unloaded from the hardware and the current
00000000  1    trace file is updated with all measurement data.
00000000  1    Author:  Kip Fulghum
00000000  1    Date:  1-16-84  Revised:  1-9-85
00000000  1  *************************************************************************
00000000  1
00000000  1    TRACE_BRK contains the following routines:
00000000  1    -Global procedure LOAD_TB is the pre-processor for the trace break
00000000  1     measurement.  It loads the appropriate data structures with the
00000000  1     necessary information to create a trace break when loaded into
00000000  1     the hardware.
00000000  1    -Global procedure UNLOAD_TB is the post-processor for the trace break
```

```
00000000 1      measurement.  It unloads the captured hardware sextuplet and writes
00000000 1      it out to the trace file.
00000000 1
00000000 1     In addition, TRACE_BRK uses the following external routines:
00000000 1     START_GEN, CLOSE_OR_NODE, SET_FEATURE,
00000000 1     GET_DATA, CLASSIFY_BREAK, FIND_STATIC, WRITE_ANLYS_REC, UNLOAD_DONE,
00000000 1     GET_OFFSET,
00000000 1     and SET_TB_PATHS.
00000000 1                                                                         *)
00000000 1   (*
00000000 1                                ***************************
00000000 1                                ***** Include Files *****
00000000 1                                ***************************
00000000 1                                                                         *)
00000000 1
00000000 1   #INCLUDE ER_CONST:SS_DYN
00000000 1
00000000 1   #INCLUDE COM_TYPES:SS_DYN
00000000 1
00000000 1   #INCLUDE LD_TYPES:SS_DYN
00000000 1
00000000 1   #INCLUDE UMLD_TYPES:SS_DYN
00000000 1
00000000 1   #INCLUDE ICMD_DATA:SODAMON
00000000 1
00000000 1
00000000 1
00000000 1
00000000 1
00000000 1   $CALL_ABS_LONGS
00000000 1   (*
00000000 1                                  **********************
00000000 1                                  ***** START_GEN *****
00000000 1                                  **********************
00000000 1                                                                         *)
00000000 1   PROCEDURE START_GEN ( VAR GENERATOR:  FUNC_RESOURCE; START_STATE,
00000000 2                         NEXT_STATE:  S_INT; VAR STATE_PTR:  STATE_REC_PTR;
00000000 2                         VAR IO_PTR:  I_O_REC_PTR; VAR HIGH_SET:
00000000 2                         HIGH_LEVEL_SET ); EXTERNAL;
00000000 1   (*
00000000 1     Procedure START_GEN to prepare a function generator for use.
00000000 1     Provided as a Pascal external.
00000000 1                                                                         *)
00000000 1
00000000 1
00000000 1
00000000 1
00000000 1
00000000 1   (*
00000000 1                                ***************************
00000000 1                                ***** CLOSE_OR_NODE *****
00000000 1                                ***************************
00000000 1                                                                         *)
00000000 1   PROCEDURE CLOSE_OR_NODE ( FINAL_OUTS:  OUT_SET_TYPE; VAR IO:  I_O_REC;
00000000 2                             VAR CLOSE_CODE:  S_INT ); EXTERNAL;
00000000 1   (*
00000000 1     Procedure CLOSE_OR_NODE to close out a function generator I/O node
00000000 1     consisting of a number of ORed terms.  Provided as a Pascal external.
00000000 1                                                                         *)
00000000 1
00000000 1
00000000 1
00000000 1
00000000 1
00000000 1   (*
00000000 1                                 *************************
00000000 1                                 ***** SET_FEATURE *****
00000000 1                                 *************************
00000000 1                                                                         *)
00000000 1   PROCEDURE SET_FEATURE ( ON_OFF:  CONDITION_TYPE; VAR FEAT_SIG:
00000000 2                           FEATURE_REC ); EXTERNAL;
00000000 1   (*
00000000 1     Procedure SET_FEATURE to turn on/off a feature signal.  Provided as
00000000 1     a Pascal external.
```

```
00000000 1                                                               *)
00000000 1
00000000 1
00000000 1
00000000 1
00000000 1
00000000 1  (*
00000000 1                         ********************
00000000 1                         ***** GET_DATA *****
00000000 1                         ********************
00000000 1                                                               *)
00000000 1  PROCEDURE GET_DATA ( START_STATE, UH_COUNTER:  S_INT; VAR FEAT_ARRAY:
00000000 2                     FEAT_ARRAY_TYPE; VAR BASE:  DOUBLE_ARRAY; VAR
00000000 2                     SEXTET:  SEXTET_REC_TYPE ); EXTERNAL;
00000000 1  (*
00000000 1    Procedure GET_DATA to retrieve a sextet worth of data out of
00000000 1    acquisition memory, translate the emulation data to generic data,
00000000 1    and decode the captured grey-code count.  Provided as a Pascal
00000000 1    external.
00000000 1                                                               *)
00000000 1
00000000 1
00000000 1
00000000 1
00000000 1
00000000 1  (*
00000000 1                       **************************
00000000 1                       ***** CLASSIFY_BREAK *****
00000000 1                       **************************
00000000 1                                                               *)
00000000 1  FUNCTION CLASSIFY_BREAK ( VAR FLAGS:  FLAG_ARRAY_TYPE; VAR FEAT_ARRAY:
00000000 2                          FEAT_ARRAY_TYPE ):  S_INT; EXTERNAL;
00000000 1  (*
00000000 1    Function CLASSIFY_BREAK to determine what caused the hardware to
00000000 1    break.  Provided as a Pascal external.
00000000 1                                                               *)
00000000 1
00000000 1
00000000 1
00000000 1
00000000 1
00000000 1  (*
00000000 1                        ***********************
00000000 1                        ***** FIND_STATIC *****
00000000 1                        ***********************
00000000 1                                                               *)
00000000 1  FUNCTION FIND_STATIC ( VAR MEAS_STRUCT:  CMD_DATA_ARRAY; VAR
00000000 2                       SYM_STRUCT:  SYM_DESCRIPS; EMUL_ADRS:  L_INT ):
00000000 2                       S_INT; EXTERNAL;
00000000 1  (*
00000000 1    Function FIND STATIC returns the index of the record in the
00000000 1    symbol table structure related to the given static data.  Provided
00000000 1    as a Pascal external.
00000000 1                                                               *)
00000000 1
00000000 1
00000000 1
00000000 1
00000000 1
00000000 1  (*
00000000 1                      ***************************
00000000 1                      ***** WRITE_ANLYS_REC *****
00000000 1                      ***************************
00000000 1                                                               *)
00000000 1  PROCEDURE WRITE_ANLYS_REC ( D_TYPE, INDEX:  S_INT; N_FIELD:  L_INT; VAR
00000000 2                            SEX_REC:  SEXTET_REC_TYPE; VAR REC_COUNT,
00000000 2                            FMGR_CODE:  S_INT ); EXTERNAL;
00000000 1  (*
00000000 1    Procedure WRITE_ANLYS_REC to create and write a trace file analysis
00000000 1    record to the disc.  Provided as a Pascal external.
00000000 1                                                               *)
00000000 1
00000000 1
00000000 1
```

```
00000000  1
00000000  1
00000000  1  (*
00000000  1                      ***********************
00000000  1                      ***** UNLOAD_DONE *****
00000000  1                      ***********************
00000000  1                                                                  *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                                  *)
00000000  1
00000000  1
00000000  1
00000000  1
00000000  1
00000000  1  (*
00000000  1                      ***********************
00000000  1                      ***** GET_OFFSET *****
00000000  1                      ***********************
00000000  1                                                                  *)
00000000  1  FUNCTION GET_OFFSET:  L_INT; EXTERNAL;
00000000  1  (*
00000000  1    Function GET_OFFSET to return the appropriate processor pre-fetch
00000000  1    offset.  Provided as a Pascal external.
00000000  1                                                                  *)
00000000  1
00000000  1
00000000  1
00000000  1
00000000  1
00000000  1  $CALL_PC_SHORTS
00000000  1  (*
00000000  1                      ************************
00000000  1                      ***** SET_TB_PATHS *****
00000000  1                      ************************
00000000  1                                                                  *)
00000000  1  PROCEDURE SET_TB_PATHS ( VAR LINE_REC:  CMD_DATA_TYPE; ID:  S_INT;
00000000  2                  VAR HIGHS:  HIGH_LEVEL_SET; VAR SPEC:
00000000  2                  HW_SPEC_REC; VAR IO:  I_O_REC; VAR SET_CODE:
00000000  2                  S_INT ); EXTERNAL;
00000000  1  (*
00000000  1    Procedure SET_TB_PATHS to set up the needed resource paths for the
00000000  1    given line.  Provided as a Pascal external.
00000000  1                                                                  *)
00000000  1
00000000  1
00000000  1
00000000  1
00000000  1
00000000  1  (*
00000000  1                      *******************
00000000  1                      ***** LOAD_TB *****
00000000  1                      *******************
00000000  1                                                                  *)
00000000  1  $GLOBPROC ON$
00000000  1  PROCEDURE LOAD_TB ( VAR MEAS_:  CMD_DATA_ARRAY; VAR SYMS_:
00000000  2              SYM_DESCRIPS; VAR SPEC_:  HW_SPEC_REC; VAR R_CODE:
00000000  2              S_INT );
00000000  2  (*
00000000  2    Procedure LOAD_TB is the pre-processor for the trace break
00000000  2    measurement.  It loads the appropriate hardware data structures with
00000000  2    the necessary information to create a trace break measurement when
00000000  2    loaded into the hardware.  Procedure goes through the entire symbol
00000000  2    table, assigning equate resources to all break points, then builds
00000000  2    the function description for the state machine in post-fix notation.
00000000  2    If one function generator is filled, the procedure switches to the
00000000  2    next function generator.  If at any time during the process a
00000000  2    required resource is not available, the translation is aborted and
00000000  2    an appropriate error code is returned to the caller.
00000000  2
00000000  2    LOAD_TB uses the following routines:  START_GEN, CLOSE_OR_NODE,
00000000  2    SET_FEATURE, and SET_TB_PATHS.
```

```
00000000  2
00000000  2     Input:  1) MEAS_, the input structure to the loader indicating
00000000  2                what the measurement is
00000000  2             2) SYMS_, a list of all unique symbols involved in the
00000000  2                measurement ( ie break points )
00000000  2             3) SPEC_, the initialized hardware specification structure
00000000  2     Output:  1) SPEC_, the completed hardware record containing
00000000  2                 specifications for usage of the:
00000000  2                a) low level resources,
00000000  2                b) high level resources,
00000000  2                c) fast sequencer,
00000000  2                d) micro-code occurance counters,
00000000  2                e) function generators,
00000000  2                f) misc. signals,
00000000  2                g) occurance counters,
00000000  2                h) extraneous features
00000000  2             2) R_CODE, a code specifying how the load turned out:
00000000  2                  -6 indicates translation error:  function description
00000000  2                     overflow
00000000  2                  -4 indicates out of high level hardware resources
00000000  2                  -3 indicates out of low level hardware resources
00000000  2                   0 indicates no error:  load completed
00000000  2                                                                      *)
00000000  2  VAR
00000000  2
00000000  2    LINE_INDEX:  S_INT; (* Index into cmd stack of line *)
00000002  2
00000002  2    I:  S_INT; (* WHILE loop index *)
00000004  2
00000004  2    STATE:  STATE_REC_PTR; (* Current function generator state node *)
00000008  2
00000008  2    IO:  I_O_REC_PTR; (* Current function generator input/output node *)
0000000C  2
0000000C  2    HL_SET:  HIGH_LEVEL_SET; (* Current set of useable high level
00000004  2                                 resources *)
00000004  2
00000004  2  BEGIN (* Procedure LOAD_TB *)
00000004  2    R_CODE := NO_ERROR; (* Be optimistic *)
0000000A  2
0000000A  2    (* Start state machine:  use Y generator first *)
0000000A  2
0000000A  2    START_GEN ( SPEC_.FUNC_GENERATORS [ Y ], 0, 0, STATE, IO, HL_SET );
00000032  2    (* Turn on enable emulation break *)
00000032  2    SET_FEATURE ( ON, SPEC_.FEATURES [ BREAK_ON_STOP ] );
00000048  2
00000048  2    (* Take a deep breath:  we're going down for a long, long time *)
00000048  2
00000048  2    I := 0;
0000004C  2    WHILE ( I < SYMS_.SYMBOL_COUNT ) AND ( R_CODE = NO_ERROR ) DO
0000006E  2      BEGIN (* Try and break on all symbols *)
0000006E  2
0000006E  2        (* Assign resources to this symbol and add to I/O node *)
0000006E  2
0000006E  2        LINE_INDEX := SYMS_.SYMBOL_ARRAY [ I ].DESCRIP_INDEX;
00000080  2        SET_TB_PATHS ( MEAS_ [ LINE_INDEX ], I, HL_SET, SPEC_, IO^,
00000080  2                       R_CODE );
000000B4  2
000000B4  2        (* Switch generators if necessary *)
000000B4  2
000000B4  2        IF ( R_CODE = OUT_OF_H_RSRCS ) AND ( SPEC_.
000000B4  2             FUNC_GENERATORS [ X ].STATE_MACH_PTR = NIL )
000000DC  2          THEN (* Time to change function generators *)
000000DC  2            BEGIN (* Switch to X function generator *)
000000DC  2              (* Close out Y *)
000000DC  2              CLOSE_OR_NODE ( [ STORE, STOP ], IO^, R_CODE );
000000F8  2              (* Open up X *)
000000F8  2              START_GEN ( SPEC_.FUNC_GENERATORS [ X ], 0, 0, STATE, IO,
000000F8  2                          HL_SET );
0000011E  2              I := I - 1 (* Back up one and try again *)
00000122  2            END; (* Switch to X function generator *)
00000122  2        I := I + 1
00000126  2      END; (* Try and break on all symbols *)
0000012A  2
0000012A  2    (* Close out the last function generator *)
```

```
0000012A  2
0000012A  2    IF R_CODE = NO_ERROR
00000134  2      THEN (* All went well *)
00000134  2        (* Close out this function generator *)
00000134  2        CLOSE_OR_NODE ( [ STORE, STOP ], IG^, R_CODE )
00000150  2  END; (* Procedure LOAD TB *)
00000000  1  $GLOBPROC OFF$
00000000  1
00000000  1
00000000  1
00000000  1
00000000  1
00000000  1  (*
00000000  1                              ********************
00000000  1                              ***** UNLOAD_TB *****
00000000  1                              ********************
00000000  1                                                                          *)
00000000  1  $GLOBPROC ON$
00000000  1  PROCEDURE UNLOAD_TB ( VAR MEAS_:  CMD_DATA_ARRAY; VAR SYMS_:
00000000  2                        SYM_DESCRIPS; VAR FLAGS_:  FLAG_ARRAY_TYPE; MAC_:
00000000  2                        S_INT; VAR SPEC_:  HW_SPEC_REC; VAR UNLD_COUNT,
00000000  2                        R_CODE:  S_INT );
00000000  2  (*
00000000  2    Procedure UNLOAD_TB is the post-processor for the trace break
00000000  2    measurement.  It unloads the hardware sextuplet and creates a valid
00000000  2    trace file data record.  If the data relates to a symbol, the correct
00000000  2    mapping to the symbol table is also made ( ie data to break point
00000000  2    mapping ).
00000000  2
00000000  2    UNLOAD_TB uses the following routines:  GET_DATA, CLASSIFY_BREAK,
00000000  2    FIND_STATIC, WRITE_ANLYS_REC, UNLOAD_DONE, and GET_OFFSET.
00000000  2
00000000  2    Input:  1) MEAS_, the structure describing the measurement at a high
00000000  2               level
00000000  2            2) SYMS_, a list of all unique symbols involved in the
00000000  2               measurement ( ie break points )
00000000  2            3) FLAGS_, the flag word data structure containing the
00000000  2               most recently read hardware flags
00000000  2            4) MAC_, the memory address counter off the memory board
00000000  2               obtained before unloading began
00000000  2            5) SPEC_, the hardware specification which captured the
00000000  2               data
00000000  2            6) UNLD_COUNT, the previous # of states unloaded and
00000000  2               shipped out to the trace file
00000000  2    Output:  1) SPEC_, the possibly modified hardware specification
00000000  2                structure
00000000  2             2) UNLD_COUNT, the updated # of states unloaded and output
00000000  2                to the trace file
00000000  2             3) R_CODE, the return code indicating how things turned out:
00000000  2                  0 indicates no error:  data records completed
00000000  2                  1 indicates end of file ( should never happen )
00000000  2                  2 indicates invalid disc ( should never happen )
00000000  2                  3 indicates file not found:  invalid DCB ( should never
00000000  2                    happen )
00000000  2                  5 indicates no free pages available
00000000  2                  7 indicates file corrupt
00000000  2                                                                          *)
00000000  2  VAR
00000000  2
00000000  2    BREAK_CAUSE:  S_INT; (* Cause of break *)
00000002  2
00000002  2    CURRENT_BASE:  DOUBLE_ARRAY; (* Storage for current base count *)
0000000A  2
0000000A  2    SEXTET_REC:  SEXTET_REC_TYPE; (* Storage for unloaded hw sextet *)
00000020  2
00000020  2    SYMBOL_INDEX:  S_INT; (* Index into symbol table to symbol info
00000158  2                             for hardware sextet *)
00000158  2
00000158  2  BEGIN (* Procedure UNLOAD_TB *)
00000158  2    R_CODE := NO_ERROR; (* Be optimistic *)
0000015E  2
0000015E  2    (* Find out if we captured anything and why we stopped *)
0000015E  2
0000015E  2    BREAK_CAUSE := CLASSIFY_BREAK ( FLAGS_, SPEC_.FEATURES );
```

```
00000178  2    IF ( BREAK_CAUSE > 0 ) AND
00000178  2      ( STORE_BIT IN FLAG_1_SET ( FLAGS_ [ FLAG_1 ] ) )
00000198  2     THEN (* We broke and stored something *)
00000198  2       BEGIN (* Find out where we broke *)
00000198  2
00000198  2         (* Pull a sextet out of the hardware *)
00000198  2
00000198  2         GET_DATA ( MAC_-1, 1, SPEC_.FEATURES, CURRENT_BASE,
00000198  2                    SEXTET_REC );
000001C0  2
000001C0  2         (* Map data to a symbol *)
000001C0  2
000001C0  2         (* Subtract pre-fetch offset back out because lines have no
000001C0  2            size associated with them *)
000001C0  2         SYMBOL_INDEX := FIND_STATIC ( MEAS_, SYMS_, SEXTET_REC.ADRS -
000001C0  2                                       GET_OFFSET );
000001EA  2
000001EA  2         (* Ship it *)
000001EA  2
000001EA  2         IF ( SYMBOL_INDEX <> -1 ) AND
000001EA  2            ( UNLOAD_DONE ( UNLD_COUNT ) = FALSE )
00000216  2           THEN (* There is a symbol *)
00000216  2             WRITE_ANLYS_REC ( STATEMENTS, SYMBOL_INDEX, 0, SEXTET_REC,
00000216  2                               UNLD_COUNT, R_CODE )
0000023A  2       END  (* Find out where we broke *)
0000023A  2  END; (* Procedure UNLOAD_TB *)
00000000  1  $GLOBPROC OFF$
00000000  1

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic Controller:  Trace Brk Utils"
00000000  1  PROGRAM TB_UTLS;
00000000  1  (*
00000000  1  ******************************** TB_UTLS ********************************
00000000  1    TB_UTLS is the module containing utilities used by the trace break
00000000  1    measurement.  These utilities are accessed by the pre and post
00000000  1    processors for creating/unloading the measurement.
00000000  1    Author:  Kip Fulghum
00000000  1    Date:  8-23-84  Revised:  12-5-84
00000000  1  *************************************************************************
00000000  1
00000000  1    TB_UTLS contains the following routines:
00000000  1    -Global procedure SET_TB_PATHS sets up the needed resource paths for
00000000  1     the given line.
00000000  1
00000000  1    In addition, TB_UTLS uses the following external routines:
00000000  1    ASSIGN_LL_RSRC, ADD_PATH,
00000000  1    GET_VALUE_MASK, GET_BUS_MASK, GET_OFFSET, and P_ADDR.
00000000  1                                                                          *)
00000000  1   (*
00000000  1                            ***************************
00000000  1                            ***** Include Files *****
00000000  1                            ***************************
00000000  1                                                                          *)
00000000  1
00000000  1  #INCLUDE EN_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1
00000000  1
00000000  1
00000000  1
00000000  1  $CALL_ABS_LONG$
```

```
00000000 1 (*
00000000 1                    **************************
00000000 1                    ***** ASSIGN_LL_RSRC *****
00000000 1                    **************************
00000000 1                                                                  *)
00000000 1 FUNCTION ASSIGN_LL_RSRC ( RSRC_TYPE:  LL_TYPE; RSRC_ID:  S_INT;
00000000 2                          LO_VALUE, LO_MASK, HI_VALUE, HI_MASK:
00000000 2                          L_INT; VAR LL_ARRAY:  LL_ARRAY_TYPE ):  S_INT;
00000002 2                          EXTERNAL;
00000000 1 (*
00000000 1   Function ASSIGN_LL_RSRC to allocate a low level resource from those
00000000 1   available for use by the caller.  Provided as a Pascal external.
00000000 1                                                                  *)
00000000 1
00000000 1
00000000 1
00000000 1
00000000 1
00000000 1 (*
00000000 1                    ***********************
00000000 1                    ***** ADD_PATH *****
00000000 1                    ***********************
00000000 1                                                                  *)
00000000 1 PROCEDURE ADD_PATH ( RSRC_TYPE:  LL_TYPE; PATH_ID:  S_INT; LO_VALUE,
00000000 2                      LO_MASK, HI_VALUE, HI_MASK:  L_INT; VAR
00000000 2                      POS_HL_SET:  HIGH_LEVEL_SET; VAR LO_ARRAY:
00000000 2                      LL_ARRAY_TYPE; VAR HI_ARRAY:  HL_ARRAY_TYPE;
00000000 2                      VAR IO:  I_O_REC; VAR CODE:  S_INT ); EXTERNAL;
00000000 1 (*
00000000 1   Procedure ADD_PATH to create and add a low to high level resource
00000000 1   path to the given function generator I/O node's input function
00000000 1   description.  Provided as a Pascal external.
00000000 1                                                                  *)
00000000 1
00000000 1
00000000 1
00000000 1
00000000 1
00000000 1 (*
00000000 1                    ****************************
00000000 1                    ***** GET_VALUE_MASK *****
00000000 1                    ****************************
00000000 1                                                                  *)
00000000 1 PROCEDURE GET_VALUE_MASK ( ACCESS:  S_INT; VAR VALUE, MASK:  L_INT );
00000000 2                            EXTERNAL;
00000000 1 (*
00000000 1   Procedure GET_VALUE_MASK to determine the appropriate value and
00000000 1   mask for tracing different processor status, ie reads, writes, etc.
00000000 1   Provided as a Pascal external.
00000000 1                                                                  *)
00000000 1
00000000 1
00000000 1
00000000 1
00000000 1
00000000 1 (*
00000000 1                    **************************
00000000 1                    ***** GET_BUS_MASK *****
00000000 1                    **************************
00000000 1                                                                  *)
00000000 1 FUNCTION GET_BUS_MASK ( BUS:  S_INT ):  L_INT; EXTERNAL;
00000000 1 (*
00000000 1   Function GET_BUS_MASK to return the processor specific mask containing
00000000 1   all 1s for all bits on the given bus.  Provided as a Pascal external.
00000000 1                                                                  *)
00000000 1
00000000 1
00000000 1
00000000 1
00000000 1
00000000 1 (*
00000000 1                    ***********************
00000000 1                    ***** GET_OFFSET *****
00000000 1                    ***********************
00000000 1                                                                  *)
00000000 1 FUNCTION GET_OFFSET:  L_INT; EXTERNAL;
```

```
00000000 1  (*
00000000 1    Function GET_OFFSET to return the appropriate processor pre-fetch
00000000 1    offset.  Provided as a Pascal external
00000000 1                                                                    *)
00000000 1
00000000 1
00000000 1
00000000 1
00000000 1
00000000 1  (*
00000000 1                             ******************
00000000 1                             ***** P_ADDR *****
00000000 1                             ******************
00000000 1                                                                    *)
00000000 1  PROCEDURE P_ADDR ( LOGICAL_ADDR:  L_INT; VAR PHYSICAL_ADDR:  L_INT );
00000000 2                   EXTERNAL;
00000000 1  (*
00000000 1    Procedure P_ADDR to return the physical address equivalent of the
00000000 1    given logical address.  Provided as a Pascal external.
00000000 1                                                                    *)
00000000 1
00000000 1
00000000 1
00000000 1
00000000 1
00000000 1  (*
00000000 1                           ************************
00000000 1                           ***** SET_TB_PATHS *****
00000000 1                           ************************
00000000 1                                                                    *)
00000000 1  $GLOBPROC ON$
00000000 1  PROCEDURE SET_TB_PATHS ( VAR LINE_REC:  CMD_DATA_TYPE; ID:  S_INT;
00000000 2                           VAR HIGHS:  HIGH_LEVEL_SET; VAR SPEC:
00000000 2                           HW_SPEC_REC; VAR IO:  I_O_REC; VAR SET_CODE:
00000000 2                           S_INT );
00000000 2  (*
00000000 2    Procedure SET_TB_PATHS to set up the needed resource paths for the
00000000 2    given line.  Procedure simply adds all needed paths to the given
00000000 2    I/O node, one at a time.  If any path cannot be created, an error is
00000000 2    returned.
00000000 2
00000000 2    SET_TB_PATHS uses the following routines:  ASSIGN_LL_RSRC, ADD_PATH,
00000000 2    GET_VALUE_MASK, GET_BUS_MASK, GET_OFFSET, and P_ADDR.
00000000 2
00000000 2    Input:  1) LINE_REC, the record describing the line to be traced
00000000 2            2) ID, the basis for the resource I.D.s to be assigned to
00000000 2               the paths ( if 0, the opcode resource is turned on )
00000000 2            3) HIGHS, the set of possible high level resources to choose
00000000 2               from when creating the paths
00000000 2            4) SPEC, the current hardware specification
00000000 2            5) IO, the input/output record to add the paths to
00000000 2    Output:  1) SPEC, the modified hardware specification from which the
00000000 2                resources were allocated
00000000 2             2) IO, the modified input/output record
00000000 2             3) SET_CODE, a return code describing how it went:
00000000 2                  -6 indicates function overflow
00000000 2                  -4 indicates out of high level hardware resources
00000000 2                  -3 indicates out of low level hardware resources
00000000 2                   0 indicates no error:  all assignments completed
00000000 2                                                                    *)
00000000 2  VAR
00000000 2
00000000 2    OP_VALUE:  L_INT; (* Processor value for opcode fetch *)
00000004 2
00000004 2    OP_MASK:  L_INT; (* Processor mask for opcode fetch *)
00000008 2
00000008 2    ADDR_MASK:  L_INT; (* Processor mask for address bus *)
0000000C 2
0000000C 2    RSRC_VALUE:  L_INT; (* Value to load resource with *)
00000010 2
00000010 2    RSRC_MASK:  L_INT; (* Mask to load resource with *)
00000014 2
00000014 2    PREFETCH:  L_INT; (* Pre-fetch offset *)
00000018 2
```

```
00000013  2    NEXT_LL:  S_INT; (* Next assigned low level resource *)
00000004  2
00000004  2  BEGIN (* Procedure SET_TB_PATHS *)
00000004  2    SET_CODE := NO_ERROR; (* It should work *)
0000000A  2
0000000A  2    (* Get processor specific values/masks *)
0000000A  2
0000000A  2    GET_VALUE_MASK ( OPCODE, OP_VALUE, OP_MASK );
00000022  2    ADDR_MASK := GET_BUS_MASK ( 0 );
00000030  2    PREFETCH := GET_OFFSET;
0000003A  2    RSRC_MASK := OP_MASK + ADDR_MASK;
00000046  2
00000046  2    (* Turn on opcode resource if necessary *)
00000046  2
00000046  2    IF ID = 0
0000004E  2      THEN (* First time through:  turn it on *)
0000004E  2        NEXT_LL := ASSIGN_LL_RSRC ( OPCODE_EQUATE, 999, OP_VALUE+
0000004E  2                                    ADDR_MASK, OP_MASK, 0, 0,
0000004E  2                                    SPEC.LOW_LEVELS );
0000007E  2
0000007E  2    (* Get resource to watch line *)
0000007E  2
0000007E  2    IF LINE_REC.OP_CODE = PROC_OP
0000008C  2      THEN (* This is a procedure *)
0000008C  2        IF LINE_REC.STATUS = ON_ENTRY
0000009C  2          THEN (* We want entry point:  break on pseudo entry *)
0000009C  2            RSRC_VALUE := LINE_REC.ENTRY + LINE_REC.ENTRY_OFFSET
0000009C  2                          + PREFETCH
000000B2  2          ELSE (* We want exit point *)
000000B2  2            RSRC_VALUE := LINE_REC.EXIT
000000C0  2      ELSE (* This is just a line *)
000000C0  2        RSRC_VALUE := LINE_REC.ADDRESS + PREFETCH;
000000D0  2    (* Logical --> physical *)
000000D0  2    P_ADDR ( RSRC_VALUE, RSRC_VALUE );
000000E0  2    RSRC_VALUE := RSRC_VALUE + OP_VALUE;
000000E8  2    ADD_PATH ( ADDRESS_EQUATE, ID, RSRC_VALUE, RSRC_MASK, 0, 0, HIGHS,
000000E8  2               SPEC.LOW_LEVELS, SPEC.HIGH_LEVELS, ID, SET_CODE )
00000128  2  END; (* Procedure SET_TB_PATHS *)
00000000  1  $GLOBPROC OFF$
00000000  1  .

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic Controller:  Trace Variables"
00000000  1  PROGRAM TRACE_VAR;
00000000  1  (*
00000000  1  ****************************** TRACE_VAR ******************************
00000000  1    TRACE_VAR is the module containing the routines for the load pre-
00000000  1    processor and the unload post-processor for the trace variables
00000000  1    measurement.  For pre-processing, the user measurement data structure
00000000  1    is translated to reflect a trace variable measurement.  For post-
00000000  1    processing, the measurement data is unloaded from the hardware,  all
00000000  1    garbage is removed, and the current trace file is updated with all
00000000  1    valid measurement data.
00000000  1    Author:  Kip Fulghum
00000000  1    Date:  10-6-82  Revised:  1-9-85
00000000  1  ************************************************************************
00000000  1
00000000  1    TRACE_VAR contains the following routines:
00000000  1    -Global procedure LOAD_TV is the pre-processor for the trace variables
00000000  1     measurement.  It loads the appropriate data structures with the
00000000  1     necessary information to create a trace variables measurement when
00000000  1     loaded into the hardware.
00000000  1    -Global procedure UNLOAD_TV is the post-processor for the trace
00000000  1     variables measurement.  It unloads the hardware one sextuplet at
00000000  1     a time, classifies the data, and creates valid trace file data
00000000  1     records.
00000000  1
00000000  1    In addition, TRACE_VAR uses the following external routines:
00000000  1    START_GEN, CLOSE_OR_NODE, CLOSE_IO_LIST, TEST_BITS,
00000000  1    HOW_MUCH_DATA, GET_DATA, CLASS_VAR_DATA, WRITE_VAR_REC,
```

```
00000000  1     UNLOAD_MSG, UNLOAD_DONE,
00000000  1     DYNAMIC_PURGE, SET_TU_PATHS, and FIX_TU_INDECES.
00000000  1
00000000  1                                                                            *)
00000000  1   (*
00000000  1                           ****************************
00000000  1                           ***** Include Files *****
00000000  1                           ****************************
00000000  1                                                                            *)
00000000  1
00000000  1   #INCLUDE ER_CONST:SS_DYN
00000000  1
00000000  1   #INCLUDE COM_TYPES:SS_DYN
00000000  1
00000000  1   #INCLUDE LD_TYPES:SS_DYN
00000000  1
00000000  1   #INCLUDE UNLD_TYPES:SS_DYN
00000000  1
00000000  1   #INCLUDE ICMD_DATA:SODAMON
00000000  1
00000000  1   VAR
00000000  1
00000000  1     DYNAMIC_PROG:  S_INT; (* Program number of dynamic variables *)
00000002  1
00000002  1     DYNAMIC_PROC:  S_INT; (* Procedure number of dynamic variables *)
00000004  1
00000004  1     (* The above program level variables must be initialized by the
00000004  1        pre-processor prior to being used by the post-processor *)
00000004  1
00000004  1
00000004  1
00000004  1
00000004  1
00000004  1   $CALL_ABS_LONGS
00000000  1   (*
00000000  1                             **************************
00000000  1                             ***** START_GEN *****
00000000  1                             **************************
00000000  1                                                                            *)
00000000  1   PROCEDURE START_GEN ( VAR GENERATOR:  FUNC_RESOURCE; START_STATE,
00000000  2                         NEXT_STATE:  S_INT; VAR STATE_PTR:  STATE_REC_PTR;
00000000  2                         VAR IO_PTR:  I_O_REC_PTR; VAR HIGH_SET:
00000000  2                         HIGH_LEVEL_SET ); EXTERNAL;
00000000  1   (*
00000000  1     Procedure START_GEN to prepare a function generator for use.
00000000  1     Provided as a Pascal external.
00000000  1                                                                            *)
00000000  1
00000000  1
00000000  1
00000000  1
00000000  1
00000000  1   (*
00000000  1                           ****************************
00000000  1                           ***** CLOSE_OR_NODE *****
00000000  1                           ****************************
00000000  1                                                                            *)
00000000  1   PROCEDURE CLOSE_OR_NODE ( FINAL_OUTS:  OUT_SET_TYPE; VAR IO:  I_O_REC;
00000000  2                             VAR CLOSE_CODE:  S_INT ); EXTERNAL;
00000000  1   (*
00000000  1     Procedure CLOSE_OR_NODE to close out a function generator I/O node
00000000  1     consisting of a number of ORed terms.  Provided as a Pascal external.
00000000  1                                                                            *)
00000000  1
00000000  1
00000000  1
00000000  1
00000000  1
00000000  1   (*
00000000  1                           ****************************
00000000  1                           ***** CLOSE_IO_LIST *****
00000000  1                           ****************************
00000000  1                                                                            *)
00000000  1   PROCEDURE CLOSE_IO_LIST ( DC_STATE:  S_INT; DC_OUTS:  OUT_SET_TYPE;
```

```
00000000 2                      VAR LAST_IO:  I_O_REC ); EXTERNAL;
00000000 1  (*
00000000 1   Procedure CLOSE_IO_LIST to close out a function generator I/O list
00000000 1   with a don't care I/O node.  Provided as a Pascal external.
00000000 1                                                                    *)
00000000 1
00000000 1
00000000 1
00000000 1
00000000 1
00000000 1  (*
00000000 1                         ***********************
00000000 1                         ***** TEST_BITS *****
00000000 1                         ***********************
00000000 1                                                                    *)
00000000 1  FUNCTION TEST_BITS ( BIT_WORD, TEST_WORD:  L_INT ):  BOOLEAN; EXTERNAL;
00000000 1  (*
00000000 1   Function TEST_BITS to see if all of the bits indicated in BIT_WORD
00000000 1   are set in TEST_WORD, ie "AND" both words and see if the result is
00000000 1   equal to BIT_WORD.  Provided as an assembly language external.
00000000 1                                                                    *)
00000000 1
00000000 1
00000000 1
00000000 1
00000000 1
00000000 1  (*
00000000 1                         ***************************
00000000 1                         ***** HOW_MUCH_DATA *****
00000000 1                         ***************************
00000000 1                                                                    *)
00000000 1  PROCEDURE HOW_MUCH_DATA ( VAR FLAGS:  FLAG_ARRAY_TYPE; VAR FEAT_ARRAY:
00000000 2                          FEAT_ARRAY_TYPE; START_MAC, END_MAC:  S_INT;
00000000 2                          VAR START_STATE, NUM_STATES:  S_INT );
00000000 2                          EXTERNAL;
00000000 1  (*
00000000 1   Procedure HOW_MUCH_DATA to determine how much data was captured and
00000000 1   starting from where.  Provided as a Pascal external.
00000000 1                                                                    *)
00000000 1
00000000 1
00000000 1
00000000 1
00000000 1
00000000 1  (*
00000000 1                         ***********************
00000000 1                         ***** GET_DATA *****
00000000 1                         ***********************
00000000 1                                                                    *)
00000000 1  PROCEDURE GET_DATA ( START_STATE, UN_COUNTER:  S_INT; VAR FEAT_ARRAY:
00000000 2                       FEAT_ARRAY_TYPE; VAR BASE:  DOUBLE_ARRAY; VAR
00000000 2                       SEXTET:  SEXTET_REC_TYPE ); EXTERNAL;
00000000 1  (*
00000000 1   Procedure GET_DATA to retrieve a sextet worth of data out of
00000000 1   acquisition memory, translate the emulation data to generic data,
00000000 1   and decode the captured grey-code count.  Provided as a Pascal
00000000 1   external.
00000000 1                                                                    *)
00000000 1
00000000 1
00000000 1
00000000 1
00000000 1
00000000 1  (*
00000000 1                         ****************************
00000000 1                         ***** CLASS_VAR_DATA *****
00000000 1                         ****************************
00000000 1                                                                    *)
00000000 1  FUNCTION CLASS_VAR_DATA ( FLAGS:  FLAG_SET ):  S_INT; EXTERNAL;
00000000 1  (*
00000000 1   Function CLASS_VAR_DATA to determine what type of variable data
00000000 1   is contained in the current hardware sextet based on the hardware
00000000 1   flags.  Provided as a Pascal external.
```

```
00000000  1                                                            *)
00000000  1
00000000  1
00000000  1
00000000  1
00000000  1
00000000  1  (*
00000000  1                        *************************
00000000  1                        ***** WRITE_VAR_REC *****
00000000  1                        *************************
00000000  1                                                            *)
00000000  1  PROCEDURE WRITE_VAR_REC ( D_TYPE, INDEX:  S_INT; M_FIELD:  L_INT; VAR
00000000  2                           SIX_REC:  SEXTET_REC_TYPE; VAR TWIN_INDIRECTS:
00000000  2                           TWIN_I_TYPE; VAR REC_COUNT, FMGR_CODE:
00000000  2                           S_INT ); EXTERNAL;
00000000  1  (*
00000000  1    Procedure WRITE_VAR_REC to create and write a trace file variable
00000000  1    analysis record to the disc.  Provided as a Pascal external.
00000000  1                                                            *)
00000000  1
00000000  1
00000000  1
00000000  1
00000000  1
00000000  1  (*
00000000  1                          ***********************
00000000  1                          ***** UNLOAD_MSG *****
00000000  1                          ***********************
00000000  1                                                            *)
00000000  1  PROCEDURE UNLOAD_MSG ( STATE:  S_INT ); EXTERNAL;
00000000  1  (*
00000000  1    Procedure UNLOAD_MSG to update the current unload message with the
00000000  1    given count.  Provided as a Pascal external.
00000000  1                                                            *)
00000000  1
00000000  1
00000000  1
00000000  1
00000000  1
00000000  1  (*
00000000  1                         ************************
00000000  1                         ***** UNLOAD_DONE *****
00000000  1                         ************************
00000000  1                                                            *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                            *)
00000000  1
00000000  1
00000000  1
00000000  1
00000000  1
00000000  1  $CALL_PC_SHORTS
00000000  1  (*
00000000  1                        **************************
00000000  1                        ***** DYNAMIC_FUDGE *****
00000000  1                        **************************
00000000  1                                                            *)
00000000  1  PROCEDURE DYNAMIC_FUDGE ( VAR MEAS:  CMD_DATA_ARRAY; DYN_PROG, DYN_PROC,
00000000  2                           DYN_STAT:  S_INT; VAR SYMS:  SYM_DESCRIPS );
00000000  2                           EXTERNAL;
00000000  1  (*
00000000  1    Procedure DYNAMIC_FUDGE to combine all dynamic variables for the given
00000000  1    program/procedure into one.  Provided as a Pascal external.
00000000  1                                                            *)
00000000  1
00000000  1
00000000  1
00000000  1
00000000  1
00000000  1  (*
00000000  1                        *************************
```

```
00000000 1                      ***** SET_TV_PATHS *****
00000000 1                      ************************
00000000 1                                                                  *)
00000000 1  PROCEDURE SET_TV_PATHS ( VAR VAR_REC:  CMD_DATA_TYPE; VAR_SIZE:  L_INT;
00000000 2                        ID:  S_INT; VAR HIGHS:  HIGH_LEVEL_SET;
00000000 2                        VAR SPEC:  HW_SPEC_REC; VAR IO:  I_O_REC;
00000000 2                        VAR SET_CODE:  S_INT ); EXTERNAL;
00000000 1  (*
00000000 1    Procedure SET_TV_PATHS to set up the needed resource paths for the
00000000 1    given variable.  Provided as a Pascal external.
00000000 1                                                                  *)
00000000 1
00000000 1
00000000 1
00000000 1
00000000 1
00000000 1  (*
00000000 1                      ***************************
00000000 1                      ***** FIX_TV_INDECES *****
00000000 1                      ***************************
00000000 1                                                                  *)
00000000 1  PROCEDURE FIX_TV_INDECES ( VAR MEAS_STRUCT:  CMD_DATA_ARRAY; VAR
00000000 2                        SYM_STRUCT:  SYM_DESCRIPS; VAR SEXTET:
00000000 2                        SEXTET_REC_TYPE; DATA_TYPE, DYN_PROG,
00000000 2                        DYN_PROC:  S_INT; VAR CUR_STACK, N_FIELD:
00000000 2                        L_INT; VAR INDECES:  S_INT ); EXTERNAL;
00000004 1  (*
00000004 1    Procedure FIX_TV_INDECES to set up the low and high byte indeces for
00000004 1    a captured sextet.  Provided as a Pascal external.
00000004 1                                                                  *)
00000004 1
00000004 1
00000004 1
00000004 1
00000004 1
00000004 1  (*
00000004 1                      ********************
00000004 1                      ***** LOAD_TV *****
00000004 1                      ********************
00000004 1                                                                  *)
00000004 1  $GLOBPROC ON$
00000000 1  PROCEDURE LOAD_TV ( VAR MEAS_:  CMD_DATA_ARRAY; VAR SYMS_:
00000000 2                  SYM_DESCRIPS; VAR SPEC_:  HW_SPEC_REC; VAR R_CODE:
00000000 2                  S_INT );
00000000 2  (*
00000000 2    Procedure LOAD_TV is the pre-processor for the trace variables
00000000 2    measurement.  It loads the appropriate hardware data structures with
00000000 2    the necessary information to create a trace variables measurement when
00000000 2    loaded into the hardware.  Procedure goes through the entire symbol
00000000 2    table, assigning resources to all symbols with non-zero measurement
00000000 2    sizes, and building the function description in post-fix notation.
00000000 2    If one function generator is filled, the procedure switches to the
00000000 2    next function generator.  If at any time during the process a
00000000 2    required resource is not available, the translation is aborted and
00000000 2    an appropriate error code is returned to the caller.
00000000 2
00000000 2    LOAD_TV uses the following routines:  START_GEN, CLOSE_OR_MODE,
00000000 2    CLOSE_IO_LIST, TEST_BITS, DYNAMIC_FUDGE, and SET_TV_PATHS.
00000000 2
00000000 2    Input:  1) MEAS_, the input structure to the loader indicating
00000000 2               what the measurement is
00000000 2            2) SYMS_, a list of all unique symbols involved in the
00000000 2               measurement
00000000 2            3) SPEC_, the initialized hardware specification structure
00000000 2    Output:  1) SPEC_, the completed hardware record containing
00000000 2                specifications for usage of the:
00000000 2                a) low level resources,
00000000 2                b) high level resources,
00000000 2                c) fast sequencer,
00000000 2                d) micro-code occurance counters,
00000000 2                e) function generators,
00000000 2                f) misc. signals,
00000000 2                g) occurance counters,
00000000 2                h) extraneous features
```

```
00000000  2             2) R_CODE, a code specifying how the load turned out:
00000000  2                 -6 indicates translation error:  function description
00000000  2                    overflow
00000000  2                 -5 indicates out of fast sequencer resources
00000000  2                 -4 indicates out of high level hardware resources
00000000  2                 -3 indicates out of low level hardware resources
00000000  2                  0 indicates no error:  load completed
00000000  2                                                                        *)
00000000  2  VAR
00000000  2
00000000  2    VAR_INDEX:  S_INT; (* Index into cmd stack of variable *)
00000002  2
00000002  2    I:  S_INT; (* WHILE loop index *)
00000004  2
00000004  2    STATE:  STATE_REC_PTR; (* Current function generator state node *)
00000008  2
00000008  2    IO:  I_O_REC_PTR; (* Current function generator input/output node *)
0000000C  2
0000000C  2    HL_SET:  HIGH_LEVEL_SET; (* Current set of useable high level
0000000E  2                                  resources *)
0000000E  2
0000000E  2    V_SIZE:  L_INT; (* Size of variable *)
00000004  2
00000004  2  BEGIN (* Procedure LOAD_TV *)
00000004  2    R_CODE := NO_ERROR; (* Be optimistic *)
0000000A  2    DYNAMIC_PROG := -1; (* Haven't seen a dynamic variable yet *)
00000010  2    DYNAMIC_PROC := -1;
00000016  2
00000016  2    (* Start state machine:  use Y generator first *)
00000016  2
00000016  2    START_GEN ( SPEC_.FUNC_GENERATORS [ Y ], 0, 0, STATE, IO, HL_SET );
0000003E  2
0000003E  2    (* Take a deep breath:  we're going down for a long, long time *)
0000003E  2
0000003E  2    I := 0;
00000042  2    WHILE ( I < SYMS_.SYMBOL_COUNT ) AND ( R_CODE = NO_ERROR ) DO
00000064  2      BEGIN (* Try and trace all symbols *)
00000064  2        VAR_INDEX := SYMS_.SYMBOL_ARRAY [ I ].DESCRIP_INDEX;
00000076  2        WITH MEAS_ [ VAR_INDEX ] DO
0000008A  2          IF ( TEST_BITS ( 8, FLAGS ) = TRUE ) AND ( ( DYNAMIC_PROG <>
0000009A  2              FILE_NUM ) OR ( DYNAMIC_PROC <> PROC_NUM ) )
000000D2  2            THEN (* Dynamic variable in a procedure we haven't seen *)
000000D2  2              BEGIN (* Set up for a dynamic variable range *)
000000D2  2                (* Save prog and proc #s for post-processor *)
000000D2  2                DYNAMIC_PROG := FILE_NUM;
000000D8  2                DYNAMIC_PROC := PROC_NUM;
000000DE  2                (* Combine all dynamics for this context *)
000000DE  2                DYNAMIC_FUDGE ( MEAS_, DYNAMIC_PROG, DYNAMIC_PROC, STATUS,
000000DE  2                                SYMS_ )
00000100  2              END; (* Set up for a dynamic variable range *)
00000100  2        V_SIZE := SYMS_.SYMBOL_ARRAY [ I ].MEAS_SIZE;
0000011A  2        IF V_SIZE <> 0
00000122  2          THEN (* This symbol is to be traced *)
00000122  2            BEGIN (* Set up to trace this symbol *)
00000122  2
00000122  2              (* Assign all necessary resources and add to I/O node *)
00000122  2
00000122  2              SET_TV_PATHS ( MEAS_ [ VAR_INDEX ], V_SIZE, I, HL_SET,
00000122  2                             SPEC_, IO^, R_CODE );
0000015A  2
0000015A  2              (* Switch generators if necessary *)
0000015A  2
0000015A  2              IF ( R_CODE = OUT_OF_H_RSRCS ) AND ( SPEC_.
0000015A  2                   FUNC_GENERATORS [ X ].STATE_MACH_PTR = NIL )
00000182  2                THEN (* Time to change function generators *)
00000182  2                  BEGIN (* Switch to X function generator *)
00000182  2                    (* Close out Y *)
00000182  2                    CLOSE_OR_NODE ( [ STORE, COUNT ], IO^, R_CODE );
0000019E  2                    CLOSE_IO_LIST ( 0, [ COUNT ], IO^ );
000001B2  2                    (* Open up X *)
000001B2  2                    START_GEN ( SPEC_.FUNC_GENERATORS [ X ], 0, 0, STATE,
000001B2  2                                IO, HL_SET );
000001D8  2                    I := I - 1 (* Back up one and try again *)
000001DC  2                  END (* Switch to X function generator *)
```

```
000001DC  2          END; (* Set up to trace this symbol *)
000001DC  2        I := I + 1
000001E0  2      END; (* Try and trace all symbols *)
000001E4  2
000001E4  2    (* Close out the last function generator *)
000001E4  2
000001E4  2    IF R_CODE = NO_ERROR
000001EE  2      THEN (* All went well *)
000001EE  2        BEGIN (* Close out this function generator *)
000001EE  2          CLOSE_OR_NODE ( [ STORE, COUNT ], IO^, R_CODE );
0000020A  2          CLOSE_IO_LIST ( 0, [ COUNT ], IO^ )
0000021E  2        END (* Close out this function generator *)
0000021E  2  END; (* Procedure LOAD_TV *)
00000000  1  $GLOBPROC OFF$
00000000  1
00000000  1
00000000  1
00000000  1
00000000  1
00000000  1  (*
00000000  1                          *********************
00000000  1                          ***** UNLOAD_TV *****
00000000  1                          *********************
00000000  1                                                               *)
00000000  1  $GLOBPROC ON$
00000000  1  PROCEDURE UNLOAD_TV ( VAR MEAS_:  CMD_DATA_ARRAY; VAR SYMS_:
00000000  2                     SYM_DESCRIPS; VAR FLAGS_:  FLAG_ARRAY_TYPE; MAC_:
00000000  2                     S_INT; VAR SPEC_:  HW_SPEC_REC; VAR UNLD_COUNT,
00000000  2                     R_CODE:  S_INT );
00000000  2  (*
00000000  2   Procedure UNLOAD_TV is the post-processor for the trace variables
00000000  2   measurement.  It unloads the hardware one sextuplet at a time,
00000000  2   classifies the data, and creates valid trace file data records.
00000000  2   If the data relates to a symbol, the correct mapping to the symbol
00000000  2   table is also made for each byte of the data.
00000000  2
00000000  2   UNLOAD_TV uses the following routines:  HOW_MUCH_DATA, GET_DATA,
00000000  2   CLASS_VAR_DATA, WRITE_VAR_REC, UNLOAD_MSG, UNLOAD_DONE, and
00000000  2   FIX_TV_INDECES.
00000000  2
00000000  2   Input:  1) MEAS_, the structure describing the measurement at a high
00000000  2              level
00000000  2           2) SYMS_, a list of all unique symbols involved in the
00000000  2              measurement
00000000  2           3) FLAGS_, the flag word data structure containing the
00000000  2              most recently read hardware flags
00000000  2           4) MAC_, the memory address counter off the memory board
00000000  2              obtained before unloading began
00000000  2           5) SPEC_, the hardware specification which captured the
00000000  2              data
00000000  2           6) UNLD_COUNT, the previous # of states unloaded and
00000000  2              shipped out to the trace file
00000000  2   Output:  1) SPEC_, the possibly modified hardware specification
00000000  2               structure
00000000  2            2) UNLD_COUNT, the updated # of states unloaded and output
00000000  2               to the trace file
00000000  2            3) R_CODE, the return code indicating how things turned out:
00000000  2                 0 indicates no error:  data records completed
00000000  2                 3 indicates file not found:  invalid DCB ( should never
00000000  2                   happen )
00000000  2                 5 indicates no free pages available
00000000  2                 7 indicates file corrupt
00000000  2                                                               *)
00000000  2  VAR
00000000  2
00000000  2   START_LOCATION:  S_INT; (* First location to unload *)
00000002  2
00000002  2   NUM_LOCATIONS:  S_INT; (* Number of locations to unload *)
00000004  2
00000004  2   MEM_COUNT:  S_INT; (* Memory unload count *)
00000006  2
00000006  2   CURRENT_BASE:  DOUBLE_ARRAY; (* Storage for current base count *)
0000000E  2
0000000E  2   SEXTET_REC:  SEXTET_REC_TYPE; (* Storage for unloaded hw sextet *)
00000024  2
```

```
473 00000024  2     INDIRECTS:  TWIN_I_TYPE; (* Indirect information *)
476 0000002C  2
477 0000002C  2     CURRENT_STACK:  L_INT; (* Storage for current stack adrs for
478 00000030  2                              dynamic variables *)
479 00000030  2
480 00000030  2     MULTI_FIELD:  L_INT; (* Temporary storage for multiple purpose field
481 00000034  2                            out on disc *)
482 00000034  2
483 00000034  2     DATA_TYPE:  S_INT; (* Type of data in hardware sextet *)
484 00000036  2
485 00000036  2     INDECES:  S_INT; (* Indeces into symbol table for both bytes *)
486 00000226  2
487 00000226  2  BEGIN (* Procedure UNLOAD_TV *)
488 00000226  2    R_CODE := NO_ERROR; (* Be optimistic *)
489 0000022C  2
490 0000022C  2    INDIRECTS.HI_I := NIL; (* There are no levels of indirection *)
491 00000230  2    INDIRECTS.LO_I := NIL;
492 00000234  2    CURRENT_STACK := -1; (* There is no current stack *)
493 0000023C  2
494 0000023C  2    (* Figure out how much to unload *)
495 0000023C  2
496 0000023C  2    HOW_MUCH_DATA ( FLAGS_, SPEC_.FEATURES, SPEC_.START_MAC, MAC_,
497 0000023C  2                    START_LOCATION, NUM_LOCATIONS );
498 00000266  2
499 00000266  2    (* Now, unload it all *)
500 00000266  2
501 00000266  2    MEM_COUNT := 1;
502 0000026C  2    WHILE ( MEM_COUNT <= NUM_LOCATIONS ) AND ( R_CODE = NO_ERROR ) AND
503 0000026C  2          ( UNLOAD_DONE ( UNLD_COUNT ) = FALSE ) DO
504 00000286  2      BEGIN (* Unload a sextet and create an equivalent data record *)
505 00000286  2        UNLOAD_MSG ( MEM_COUNT );
506 000002B0  2
507 000002B0  2        (* Pull a sextet out of the hardware *)
508 000002B0  2
509 000002B0  2        GET_DATA ( START_LOCATION, MEM_COUNT, SPEC_.FEATURES,
510 000002B0  2                   CURRENT_BASE, SEXTET_REC );
511 000002D4  2
512 000002D4  2        (* Determine what type of data we got *)
513 000002D4  2
514 000002D4  2        DATA_TYPE := CLASS_VAR_DATA ( SEXTET_REC.FLAGS );
515 000002E4  2
516 000002E4  2        (* Find the indeces for this data *)
517 000002E4  2
518 000002E4  2        FIX_TV_INDECES ( MEAS_, SYMS_, SEXTET_REC, DATA_TYPE,
519 000002E4  2                         DYNAMIC_PROC, DYNAMIC_PROC, CURRENT_STACK,
520 000002E4  2                         MULTI_FIELD, INDECES );
521 00000316  2
522 00000316  2        (* Ship it *)
523 00000316  2
524 00000316  2        IF INDECES <> -1
525 00000322  2          THEN (* Unloaded data should be written to disc *)
526 00000322  2            (* So write it *)
527 00000322  2            WRITE_VAR_REC ( DATA_TYPE, INDECES, MULTI_FIELD, SEXTET_REC,
528 00000322  2                            INDIRECTS, UNLD_COUNT, R_CODE );
529 0000034C  2        MEM_COUNT := MEM_COUNT + 1
530 00000350  2      END (* Unload a sextet and create an equivalent data record *)
531 00000354  2  END; (* Procedure UNLOAD_TV *)
532 00000000  1  $GLOBPROC OFF$
533 00000000  1  .

508: Warning: field or entry alignment; record or array comparisons may not work

End of compilation, number of errors=    0
  1 00000000  1  "68000" PREPROCESS
  2 00000000  1  $EXTENSIONS ON$
  3 00000000  1  $TITLE "Soda Dynamic Controller:  Trace Var Utils"
  4 00000000  1  PROGRAM TV_UTLS;
  5 00000000  1  (*
  6 00000000  1  ******************************** TV_UTLS ********************************
  7 00000000  1    TV_UTLS is the module containing utilities used by the trace
  8 00000000  1    variables measurement.  These utilities are accessed by the pre and
  9 00000000  1    post processors for creating/unloading the measurement.
 10 00000000  1    Author:  Kip Fulghum
 11 00000000  1    Date:  8-23-84  Revised:  12-14-84
```

```
00000000 1 ****************************************************************************
00000000 1
00000000 1   TV_UTLS contains the following routines:
00000000 1   -Function BUILD_OFFSET builds the fast sequencer offset/status field
00000000 1    pattern.
00000000 1   -Procedure ADD_DYNAMIC allocates the necessary resources to trace
00000000 1    a dynamic address range, then adds it to the partially translated
00000000 1    measurement description.
00000000 1   -Global procedure DYNAMIC_FUDGE combines all dynamic variables for the
00000000 1    given program/procedure into one.
00000000 1   -Global procedure SET_TV_PATHS sets up the needed resource paths for
00000000 1    the given variable.
00000000 1   -Global procedure FIX_TV_INDECES sets up the low and high byte indeces
00000000 1    for a captured sextet.
00000000 1
00000000 1   In addition, TV_UTLS uses the following external routines:
00000000 1   ASSIGN_FSTATE, ASSIGN_FIO, ASSIGN_LL_RSRC, ADD_PATH, ADD_OPERAND,
00000000 1   TEST_BITS, MASK_BITS, FIND_STATIC, FIND_DYNAMIC,
00000000 1   GET_VALUE_MASK, GET_BUS_MASK, GET OFFSET, and P_ADDR.
00000000 1
00000000 1                                                                        *)
00000000 1  (*
00000000 1                              **************************
00000000 1                              ***** Include Files *****
00000000 1                              **************************
00000000 1                                                                        *)
00000000 1
00000000 1  #INCLUDE FSR_CONST:SS_DYN
00000000 1
00000000 1  #INCLUDE ER_CONST:SS_DYN
00000000 1
00000000 1  #INCLUDE COM_TYPES:SS_DYN
00000000 1
00000000 1  #INCLUDE LD_TYPES:SS_DYN
00000000 1
00000000 1  #INCLUDE UNLD_TYPES:SS_DYN
00000000 1
00000000 1  #INCLUDE ICMD_DATA:SDMAMON
00000000 1
00000000 1
00000000 1
00000000 1
00000000 1
00000000 1  $CALL_ABS_LONG$
00000000 1  (*
00000000 1                              **************************
00000000 1                              ***** ASSIGN_FSTATE *****
00000000 1                              **************************
00000000 1                                                                        *)
00000000 1  FUNCTION ASSIGN_FSTATE ( CUR_STATE:  STATE_TYPE ):  FSTATE_REC_PTR;
00000000 2                                EXTERNAL;
00000000 1  (*
00000000 1    Function ASSIGN_FSTATE to create a new state node for the fast
00000000 1    sequencer data structure.  Provided as a Pascal external.
00000000 1                                                                        *)
00000000 1
00000000 1
00000000 1
00000000 1
00000000 1
00000000 1  (*
00000000 1                               ***********************
00000000 1                               ***** ASSIGN_FIO *****
00000000 1                               ***********************
00000000 1                                                                        *)
00000000 1  FUNCTION ASSIGN_FIO ( NEXT_STATE:  STATE_TYPE ):  FI_O_REC_PTR;
00000000 2                           EXTERNAL;
00000000 1  (*
00000000 1    Function ASSIGN_FIO to create a new I/O node for the fast
00000000 1    sequencer data structure.  Provided as a Pascal external.
00000000 1                                                                        *)
00000000 1
00000000 1
00000000 1
```

```
00000000  1
00000000  1
00000000  1  (*
00000000  1                       ***************************
00000000  1                       ***** ASSIGN_LL_RSRC *****
00000000  1                       ***************************
00000000  1                                                                  *)
00000000  1  FUNCTION ASSIGN_LL_RSRC ( RSRC_TYPE:  LL_TYPE; RSRC_ID:  S_INT;
00000000  2                          LO_VALUE, LO_MASK, HI_VALUE, HI_MASK:
00000000  2                          L_INT; VAR LL_ARRAY:  LL_ARRAY_TYPE ):  S_INT;
00000002  2                          EXTERNAL;
00000000  1  (*
00000000  1    Function ASSIGN_LL_RSRC to allocate a low level resource from those
00000000  1    available for use by the caller.  Provided as a Pascal external.
00000000  1                                                                  *)
00000000  1
00000000  1
00000000  1
00000000  1
00000000  1
00000000  1  (*
00000000  1                         *********************
00000000  1                         ***** ADD_PATH *****
00000000  1                         *********************
00000000  1                                                                  *)
00000000  1  PROCEDURE ADD_PATH ( RSRC_TYPE:  LL_TYPE; PATH_ID:  S_INT; LO_VALUE,
00000000  2                     LO_MASK, HI_VALUE, HI_MASK:  L_INT; VAR
00000000  2                     POS_HL_SET:  HIGH_LEVEL_SET; VAR LO_ARRAY:
00000000  2                     LL_ARRAY_TYPE; VAR HI_ARRAY:  HL_ARRAY_TYPE;
00000000  2                     VAR IO:  I_O_REC; VAR CODE:  S_INT ); EXTERNAL;
00000000  1  (*
00000000  1    Procedure ADD_PATH to create and add a low to high level resource
00000000  1    path to the given function generator I/O node's input function
00000000  1    description.  Provided as a Pascal external.
00000000  1                                                                  *)
00000000  1
00000000  1
00000000  1
00000000  1
00000000  1
00000000  1  (*
00000000  1                         ************************
00000000  1                         ***** ADD_OPERAND *****
00000000  1                         ************************
00000000  1                                                                  *)
00000000  1  PROCEDURE ADD_OPERAND ( VAR INPUT:  CONDITION_REC; VAR IO:  I_O_REC;
00000000  2                          VAR CODE:  S_INT ); EXTERNAL;
00000000  1  (*
00000000  1    Procedure ADD_OPERAND to "push" an operand onto a function generator
00000000  1    input function description.  Provided as a Pascal external.
00000000  1                                                                  *)
00000000  1
00000000  1
00000000  1
00000000  1
00000000  1
00000000  1  (*
00000000  1                         **********************
00000000  1                         ***** TEST_BITS *****
00000000  1                         **********************
00000000  1                                                                  *)
00000000  1  FUNCTION TEST_BITS ( BIT_WORD, TEST_WORD:  L_INT ):  BOOLEAN; EXTERNAL;
00000000  1  (*
00000000  1    Function TEST_BITS to see if all of the bits indicated in BIT_WORD
00000000  1    are set in TEST_WORD, ie "AND" both words and see if the result is
00000000  1    equal to BIT_WORD.  Provided as an assembly language external.
00000000  1                                                                  *)
00000000  1
00000000  1
00000000  1
00000000  1
00000000  1
00000000  1  (*
00000000  1                         **********************
```

```
00000000 1                          ***** MASK_BITS *****
00000000 1                          *********************
00000000 1                                                                        *)
00000000 1  FUNCTION MASK_BITS ( BIT_WORD, MASK_WORD:  L_INT ):  L_INT; EXTERNAL;
00000000 1  (*
00000000 1    Function MASK_BITS to mask off all zero bits indicated in BIT_WORD
00000000 1    in MASK_WORD, ie "AND" BIT_WORD with MASK_WORD and return the result.
00000000 1    Provided as an assembly language external.
00000000 1                                                                        *)
00000000 1
00000000 1
00000000 1
00000000 1
00000000 1
00000000 1  (*
00000000 1                          *************************
00000000 1                          ***** FIND_STATIC *****
00000000 1                          *************************
00000000 1                                                                        *)
00000000 1  FUNCTION FIND_STATIC ( VAR MEAS_STRUCT:  CMD_DATA_ARRAY; VAR
00000000 2                         SYM_STRUCT:  SYM_DESCRIPS; EMUL_ADRS:  L_INT ):
00000000 2                         S_INT; EXTERNAL;
00000000 1  (*
00000000 1    Function FIND_STATIC returns the index of the record in the
00000000 1    symbol table structure related to the given static data.  Provided
00000000 1    as a Pascal external.
00000000 1                                                                        *)
00000000 1
00000000 1
00000000 1
00000000 1
00000000 1
00000000 1  (*
00000000 1                          **************************
00000000 1                          ***** FIND_DYNAMIC *****
00000000 1                          **************************
00000000 1                                                                        *)
00000000 1  FUNCTION FIND_DYNAMIC ( VAR MEAS_STRUCT:  CMD_DATA_ARRAY; VAR
00000000 2                         SYM_STRUCT:  SYM_DESCRIPS; EMUL_OFST:
00000000 2                         L_INT; PROG, PROC:  S_INT ):  S_INT; EXTERNAL;
00000000 1  (*
00000000 1    Function FIND_DYNAMIC returns the index of the record in the
00000000 1    symbol table structure related to the given dynamic data.  Provided
00000000 1    as a Pascal external.
00000000 1                                                                        *)
00000000 1
00000000 1
00000000 1
00000000 1
00000000 1
00000000 1  (*
00000000 1                          ****************************
00000000 1                          ***** GET_VALUE_MASK *****
00000000 1                          ****************************
00000000 1                                                                        *)
00000000 1  PROCEDURE GET_VALUE_MASK ( ACCESS:  S_INT; VAR VALUE, MASK:  L_INT );
00000000 2                             EXTERNAL;
00000000 1  (*
00000000 1    Procedure GET_VALUE_MASK to determine the appropriate value and
00000000 1    mask for tracing different processor status, ie reads, writes, etc.
00000000 1    Provided as a Pascal external.
00000000 1                                                                        *)
00000000 1
00000000 1
00000000 1
00000000 1
00000000 1
00000000 1  (*
00000000 1                          *************************
00000000 1                          ***** GET_BUS_MASK *****
00000000 1                          *************************
00000000 1                                                                        *)
00000000 1  FUNCTION GET_BUS_MASK ( BUS:  S_INT ):  L_INT; EXTERNAL;
00000000 1  (*
```

```
00000000 1    Function GET_BUS_MASK to return the processor specific mask containing
00000000 1    all 1s for all bits on the given bus.  Provided as a Pascal external
00000000 1                                                                        *)
00000000 1
00000000 1
00000000 1
00000000 1
00000000 1
00000000 1  (*
00000000 1                        **********************
00000000 1                        ***** GET_OFFSET *****
00000000 1                        **********************
00000000 1                                                                        *)
00000000 1  FUNCTION GET_OFFSET:  L_INT; EXTERNAL;
00000000 1  (*
00000000 1   Function GET_OFFSET to return the appropriate processor pre-fetch
00000000 1   offset.  Provided as a Pascal external.
00000000 1                                                                        *)
00000000 1
00000000 1
00000000 1
00000000 1
00000000 1
00000000 1  (*
00000000 1                        ******************
00000000 1                        ***** P_ADDR *****
00000000 1                        ******************
00000000 1                                                                        *)
00000000 1  PROCEDURE P_ADDR ( LOGICAL_ADDR:  L_INT; VAR PHYSICAL_ADDR:  L_INT );
00000000 2                     EXTERNAL;
00000000 1  (*
00000000 1   Procedure P_ADDR to return the physical address equivalent of the
00000000 1   given logical address.  Provided as a Pascal external.
00000000 1                                                                        *)
00000000 1
00000000 1
00000000 1
00000000 1
00000000 1
00000000 1  $CALL_PC_SHORTS
00000000 1  (*
00000000 1                        ************************
00000000 1                        ***** BUILD_OFFSET *****
00000000 1                        ************************
00000000 1                                                                        *)
00000000 1  FUNCTION BUILD_OFFSET ( STATUS, OFFSET:  L_INT ):  L_INT;
00000004 2  (*
00000004 2   Function BUILD_OFFSET to build the fast sequencer offset/status field
00000004 2   pattern.  Function adds the given status and offset, masking off
00000004 2   to 24 bits, then adds in the masked status in the upper 8 bits.
00000004 2
00000004 2   BUILD_OFFSET uses the following routine:  MASK_BITS.
00000004 2
00000004 2   Input:  1) STATUS, the status pattern
00000004 2           2) OFFSET, the address offset
00000004 2   Output:  1) the correct fast sequencer/status field pattern masked
00000004 2               to 24 bits, in function name
00000004 2                                                                        *)
00000004 2  BEGIN (* Function BUILD_OFFSET *)
00000004 2   BUILD_OFFSET := MASK_BITS ( 00FFFFFFH, STATUS + OFFSET )+
00000004 2                   MASK_BITS ( 0FF000000H, STATUS )
0000003C 2  END; (* Function BUILD_OFFSET *)
00000000 1
00000000 1
00000000 1
00000000 1
00000000 1
00000000 1  (*
00000000 1                        ***********************
00000000 1                        ***** ADD_DYNAMIC *****
00000000 1                        ***********************
00000000 1                                                                        *)
00000000 1  PROCEDURE ADD_DYNAMIC ( VAR VAR_REC:  CMD_DATA_TYPE; LENGTH, STAT_VALUE,
00000000 2                          STAT_MASK:  L_INT; VAR FUNC_TERM:
```

```
00000000  2                    CONDITION_REC; VAR FAST_SQR:  FSR_REC_TYPE;
00000000  2                    VAR IO: ^I_O_REC; VAR CODE:  S_INT );
00000000  2  (*
00000000  2   Procedure ADD_DYNAMIC to allocate the necessary resources to trace
00000000  2   a dynamic address range, then add it to the partially translated
00000000  2   measurement description.  Procedure first checks to see if the fast
00000000  2   sequencer is available.  If so, the fast sequencer RAMs are set up
00000000  2   for finding the range and the appropriate fast sequencer state machine
00000000  2   is created.  Then, the appropriate terms are added to the given
00000000  2   function generator I/O description.
00000000  2
00000000  2   I appologize for the length of this procedure, but it really doesn't
00000000  2   break up into iddy-biddy pieces very well.  It is long, but "bery
00000000  2   bery" straight forward!
00000000  2
00000000  2   ADD_DYNAMIC uses the following routines:  BUILD_OFFSET, ASSIGN_FSTATE,
00000000  2   ASSIGN_FIO, ADD_OPERAND, GET_VALUE_MASK, GET_BUS_MASK, GET_OFFSET,
00000000  2   and P_ADDR.
00000000  2
00000000  2   Input:  1) VAR_REC, the record describing the dynamic variable
00000000  2              to be traced
00000000  2           2) LENGTH, the length in bytes of the range
00000000  2           3) STAT_VALUE, the status value of the dynamic address range
00000000  2           4) STAT_MASK, the status care/don't care mask of the
00000000  2              dynamic address range
00000000  2           5) FUNC_TERM, the term to be added to the I/O function
00000000  2              description array
00000000  2           6) FAST_SQR, the record describing usage of the fast sequencer
00000000  2           7) IO, the I/O node whose input function is to be modified
00000000  2   Output:  1) FAST_SQR, the updated fast sequencer record describing
00000000  2              its usage
00000000  2            2) IO, the I/O node with the appropriate term added
00000000  2            3) CODE, the return code specifying how the add went:
00000000  2               -6 indicates translation error:  function description
00000000  2                  overflow
00000000  2               -5 indicates out of fast sequencer resources
00000000  2                0 indicates no error:  operation completed
00000000  2                                                                   *)
00000000  2  VAR
00000000  2
00000000  2    OP_VALUE:  L_INT; (* Processor value for opcode fetch *)
00000004  2
00000004  2    OP_MASK:  L_INT; (* Processor mask for opcode fetch *)
00000008  2
00000008  2    ADDR_MASK:  L_INT; (* Processor mask for address bus *)
0000000C  2
0000000C  2    W_VALUE:  L_INT; (* Processor value for write access *)
00000010  2
00000010  2    W_MASK:  L_INT; (* Processor mask for write access *)
00000014  2
00000014  2    R_VALUE:  L_INT; (* Processor value for read access *)
00000018  2
00000018  2    R_MASK:  L_INT; (* Processor mask for read access *)
0000001C  2
0000001C  2    FSTATE:  FSTATE_REC_PTR; (* Current fast sequencer state ptr *)
00000020  2
00000020  2    FIO:  FI_O_REC_PTR; (* Current fast sequencer I/O ptr *)
00000048  2
00000048  2  BEGIN (* Procedure ADD_DYNAMIC *)
00000048  2    CODE := NO_ERROR;
0000004E  2
0000004E  2       (* Here we go.......... *)
0000004E  2
0000004E  2    IF FAST_SQR.STATE_MACH_PTR <> NIL
0000005A  2      THEN (* The fast sequencer is already being used *)
0000005A  2        CODE := OUT_OF_FSR
00000066  2      ELSE (* It's free *)
00000066  2        WITH FAST_SQR DO
0000006E  2          BEGIN (* Set up the fast sequencer *)
0000006E  2
0000006E  2            (* Get processor specific values and masks *)
0000006E  2            GET_VALUE_MASK ( OPCODE, OP_VALUE, OP_MASK );
00000086  2            GET_VALUE_MASK ( WRITE, W_VALUE, W_MASK );
0000009E  2            GET_VALUE_MASK ( READ, R_VALUE, R_MASK );
000000B6  2            ADDR_MASK := GET_BUS_MASK ( 0 );
```

```
000000C4  2
000000C4  2       (* Set up initial values for fast sequencer.  The initial
000000C4  2          values for the adder have already been set to 0 *)
000000C4  2
000000C4  2       LO_RG_MASK := STAT_MASK + ADDR_MASK;
000000D4  2       HI_RG_MASK := LO_RG_MASK;
000000DE  2       LO_EQ_MASK := OP_MASK + ADDR_MASK;
000000EE  2
000000EE  2       (* Call GET_OFFSET to get offset to eliminate pre-fetch
000000EE  2          problem *)
000000EE  2       P_ADDR ( VAR_REC.ENTRY, LO_EQ_VAL ); (* Logical -->
00000106  2                                               physical *)
00000106  2       LO_EQ_VAL :=  LO_EQ_VAL + OP_VALUE + GET_OFFSET;
00000130  2       HI_EQ_MASK := W_MASK;
0000013A  2       HI_EQ_VAL :=  W_VALUE + ADDR_MASK;
0000014A  2
0000014A  2       (* Take a deep, deep breath and pray a lot *)
0000014A  2
0000014A  2       (********** Create state 0 **********)
0000014A  2       (* Watch for entry to procedure *)
0000014A  2
0000014A  2       FSTATE := ASSIGN_FSTATE ( 0 );
00000158  2       STATE_MACH_PTR := FSTATE;
00000162  2
00000162  2       (* Create first I/O node for state 0 *)
00000162  2       FIO := ASSIGN_FIO ( 1 );
00000172  2       FSTATE^.I_O_PTR := FIO;
0000017C  2       FIO^.INPUT_ [ 0 ].TAG := OPERAND_;
00000182  2       FIO^.INPUT_ [ 0 ].OPERAND := FSR_INPUTS [ EQ_LO_EQUATE ];
0000019C  2       FIO^.INPUT_ [ 1 ].TAG := END_;
000001A6  2       FIO^.OUTPUT_WORD1 := 0;
000001AE  2       FIO^.OUTPUT_WORD2 := DONT_SAVE_SUM + FORCE_ZERO_OP + NO_LOAD;
000001BA  2
000001BA  2       (* Create second I/O node for state 0 *)
000001BA  2       FIO^.NEXT_I_O_PTR := ASSIGN_FIO ( 0 );
000001D6  2       FIO := FIO^.NEXT_I_O_PTR;
000001E0  2       FIO^.OUTPUT_WORD1 := 0;
000001E8  2       FIO^.OUTPUT_WORD2 := DONT_SAVE_SUM + FORCE_ZERO_OP + NO_LOAD;
000001F4  2
000001F4  2       (********** Create state 1 **********)
000001F4  2       (* Store link write stack address, add variable offset in *)
000001F4  2
000001F4  2       FSTATE^.NEXT_STATE_PTR := ASSIGN_FSTATE ( 1 );
00000206  2       FSTATE := FSTATE^.NEXT_STATE_PTR;
0000020A  2
0000020A  2       (* Create first I/O node for state 1 *)
0000020A  2       FIO := ASSIGN_FIO ( 2 );
0000021A  2       FSTATE^.I_O_PTR := FIO;
00000224  2       FIO^.INPUT_ [ 0 ].TAG := OPERAND_;
0000022A  2       FIO^.INPUT_ [ 0 ].OPERAND := FSR_INPUTS [ EQ_HI_EQUATE ];
00000244  2       FIO^.INPUT_ [ 1 ].TAG := END_;
0000024E  2       FIO^.OUTPUT_ [ FSRX ].CONDITION := ON;
0000025A  2       FIO^.OUTPUT_ [ FSRY ].CONDITION := ON;
00000266  2       FIO^.OUTPUT_ [ STORE_FSR ].CONDITION := ON;
00000270  2       (* Start range 1 byte lower than variable address to make sure
00000270  2          we capture word accesses to odd address byte variables! *)
00000270  2       FIO^.OUTPUT_WORD1 := BUILD_OFFSET ( STAT_VALUE,
00000270  2                                   VAR_REC.ADDRESS-1 );
00000298  2       FIO^.OUTPUT_WORD2 := SAVE_SUM + ADD_EM_ADRS_OP +
00000298  2                            LOAD_RG_LV;
000002A4  2
000002A4  2       (* Create second I/O node for state 1 *)
000002A4  2       FIO^.NEXT_I_O_PTR := ASSIGN_FIO ( 1 );
000002C2  2       FIO := FIO^.NEXT_I_O_PTR;
000002CC  2       FIO^.OUTPUT_WORD1 := 0;
000002D4  2       FIO^.OUTPUT_WORD2 := DONT_SAVE_SUM + FORCE_ZERO_OP + NO_LOAD;
000002E0  2
000002E0  2       (********** Create state 2 **********)
000002E0  2       (* Add in variable length to get upper bound of variable *)
000002E0  2
000002E0  2       FSTATE^.NEXT_STATE_PTR := ASSIGN_FSTATE ( 2 );
000002F2  2       FSTATE := FSTATE^.NEXT_STATE_PTR;
000002F6  2
000002F6  2       (* Create first I/O node for state 2 *)
```

```
000002F6  2   FIO := ASSIGN_FIO ( 3 );
00000306  2   FSTATE^.I_O_PTR := FIO;
00000310  2   (* Don't subtract 1 from length because address range started
00000310  2      1 down from real address! *)
00000310  2   FIO^.OUTPUT_WORD1 := BUILD_OFFSET ( STAT_VALUE, LENGTH );
00000330  2   FIO^.OUTPUT_WORD2 := DONT_SAVE_SUM + ADD_ACCUM_OP +
00000330  2                        LOAD_RG_UV;
0000033C  2
0000033C  2   (********** Create state 3 **********)
0000033C  2   (* Start loading address of return adrs on stack, store all
0000033C  2      accesses to the variable *)
0000033C  2
0000033C  2   FSTATE^.NEXT_STATE_PTR := ASSIGN_FSTATE ( 3 );
0000034E  2   FSTATE := FSTATE^.NEXT_STATE_PTR;
00000352  2
00000352  2   (* Create first I/O node for state 3 *)
00000352  2   FIO := ASSIGN_FIO ( 4 );
00000362  2   FSTATE^.I_O_PTR := FIO;
0000036C  2   FIO^.INPUT_ [ 0 ].TAG := OPERAND_;
00000372  2   FIO^.INPUT_ [ 0 ].OPERAND := FSR_INPUTS [ GE_LO_RANGE ];
0000038C  2   FIO^.INPUT_ [ 1 ].TAG := OPERAND_;
00000394  2   FIO^.INPUT_ [ 1 ].OPERAND := FSR_INPUTS [ LE_HI_RANGE ];
000003B2  2   FIO^.INPUT_ [ 2 ].TAG := AND_;
000003BC  2   FIO^.INPUT_ [ 3 ].TAG := END_;
000003C6  2   FIO^.OUTPUT_ [ STORE_FSR ].CONDITION := ON;
000003D0  2   (* Compute stack adrs of 1st word of ret adrs.  Take into
000003D0  2      account that var address already in accumulator is 1 down
000003D0  2      from real variable address! *)
000003D0  2   FIO^.OUTPUT_WORD1 := BUILD_OFFSET ( R_VALUE,
000003D0  2                                       3-VAR_REC.ADDRESS );
000003FE  2   FIO^.OUTPUT_WORD2 := DONT_SAVE_SUM + ADD_ACCUM_OP +
000003FE  2                        LOAD_EQ_UV,
0000040A  2
0000040A  2   (* Create second I/O node for state 3 *)
0000040A  2   FIO^.NEXT_I_O_PTR := ASSIGN_FIO ( 4 );
00000428  2   FIO := FIO^.NEXT_I_O_PTR;
00000432  2   (* Compute stack adrs of 1st word of ret adrs.  Take into
00000432  2      account that var address already in accumulator is 1 down
00000432  2      from real variable address! *)
00000432  2   FIO^.OUTPUT_WORD1 := BUILD_OFFSET ( R_VALUE,
00000432  2                                       3-VAR_REC.ADDRESS );
00000460  2   FIO^.OUTPUT_WORD2 := DONT_SAVE_SUM + ADD_ACCUM_OP +
00000460  2                        LOAD_EQ_UV;
0000046C  2
0000046C  2   (********** Create state 4 **********)
0000046C  2   (* Load mask value for reading return adrs off stack, store
0000046C  2      all accesses to the variable *)
0000046C  2
0000046C  2   FSTATE^.NEXT_STATE_PTR := ASSIGN_FSTATE ( 4 );
0000047E  2   FSTATE := FSTATE^.NEXT_STATE_PTR;
00000482  2
00000482  2   (* Create first I/O node for state 4 *)
00000482  2   FIO := ASSIGN_FIO ( 5 );
00000492  2   FSTATE^.I_O_PTR := FIO;
0000049C  2   FIO^.INPUT_ [ 0 ].TAG := OPERAND_;
000004A2  2   FIO^.INPUT_ [ 0 ].OPERAND := FSR_INPUTS [ GE_LO_RANGE ];
000004BC  2   FIO^.INPUT_ [ 1 ].TAG := OPERAND_;
000004C4  2   FIO^.INPUT_ [ 1 ].OPERAND := FSR_INPUTS [ LE_HI_RANGE ];
000004E2  2   FIO^.INPUT_ [ 2 ].TAG := AND_;
000004EC  2   FIO^.INPUT_ [ 3 ].TAG := END_;
000004F6  2   FIO^.OUTPUT_ [ STORE_FSR ].CONDITION := ON;
00000500  2   FIO^.OUTPUT_WORD1 := BUILD_OFFSET ( R_MASK, ADDR_MASK );
00000520  2   FIO^.OUTPUT_WORD2 := DONT_SAVE_SUM + FORCE_ZERO_OP +
00000520  2                        LOAD_EQ_UM;
0000052C  2
0000052C  2   (* Create second I/O node for state 4 *)
0000052C  2   FIO^.NEXT_I_O_PTR := ASSIGN_FIO ( 5 );
0000054A  2   FIO := FIO^.NEXT_I_O_PTR;
00000554  2   FIO^.OUTPUT_WORD1 := BUILD_OFFSET ( R_MASK, ADDR_MASK );
00000574  2   FIO^.OUTPUT_WORD2 := DONT_SAVE_SUM + FORCE_ZERO_OP +
00000574  2                        LOAD_EQ_UM;
00000580  2
00000580  2   (********** Create state 5 **********)
00000580  2   (* Store all accesses to the variable *)
00000580  2
```

```
00000580 2              FSTATE^.NEXT_STATE_PTR := ASSIGN_FSTATE ( 5 );
00000592 2              FSTATE := FSTATE^.NEXT_STATE_PTR;
00000596 2
00000596 2              (* Create first I/O node for state 5 *)
00000596 2              FIO := ASSIGN_FIO ( 6 );
000005A6 2              FSTATE^.I_O_PTR := FIO;
000005B0 2              FIO^.INPUT_ [ 0 ].TAG := OPERAND_;
000005B6 2              FIO^.INPUT_ [ 0 ].OPERAND := FSR_INPUTS [ EQ_HI_EQUATE ];
000005D0 2              FIO^.INPUT_ [ 1 ].TAG := END_;
000005DA 2              FIO^.OUTPUT_WORD1 := BUILD_OFFSET ( W_VALUE, ADDR_MASK );
000005FA 2              FIO^.OUTPUT_WORD2 := DONT_SAVE_SUM + FORCE_ZERO_OP +
000005FA 2                                   LOAD_EQ_UW;
00000606 2
00000606 2              (* Create second I/O node for state 5 *)
00000606 2              FIO^.NEXT_I_O_PTR := ASSIGN_FIO ( 5 );
00000624 2              FIO := FIO^.NEXT_I_O_PTR;
0000062E 2              FIO^.INPUT_ [ 0 ].TAG := OPERAND_;
00000634 2              FIO^.INPUT_ [ 0 ].OPERAND := FSR_INPUTS [ GE_LO_RANGE ];
0000064E 2              FIO^.INPUT_ [ 1 ].TAG := OPERAND_;
00000656 2              FIO^.INPUT_ [ 1 ].OPERAND := FSR_INPUTS [ LE_HI_RANGE ];
00000674 2              FIO^.INPUT_ [ 2 ].TAG := AND_;
0000067E 2              FIO^.INPUT_ [ 3 ].TAG := END_;
00000688 2              FIO^.OUTPUT_ [ STORE_FSR ].CONDITION := ON;
00000692 2              FIO^.OUTPUT_WORD1 := 0;
0000069A 2              FIO^.OUTPUT_WORD2 := DONT_SAVE_SUM + FORCE_ZERO_OP + NO_LOAD;
000006A6 2
000006A6 2              (* Create third I/O node for state 5 *)
000006A6 2              FIO^.NEXT_I_O_PTR := ASSIGN_FIO ( 5 );
000006C4 2              FIO := FIO^.NEXT I O PTR;
000006CE 2              FIO^.OUTPUT_WORD1 := 0;
000006D6 2              FIO^.OUTPUT_WORD2 := DONT_SAVE_SUM + FORCE_ZERO_OP + NO_LOAD;
000006E2 2
000006E2 2              (********** Create state 6 **********)
000006E2 2              (* Reload watching for link data write, reset to state 0 *)
000006E2 2
000006E2 2              FSTATE^.NEXT_STATE_PTR := ASSIGN_FSTATE ( 6 );
000006F4 2              FSTATE := FSTATE^.NEXT_STATE_PTR;
000006F8 2
000006F8 2              (* Create first I/O node for state 6 *)
000006F8 2              FIO := ASSIGN_FIO ( 0 );
00000706 2              FSTATE^.I_O_PTR := FIO;
00000710 2              FIO^.OUTPUT_WORD1 := BUILD_OFFSET ( W_MASK, 0 );
0000072E 2              FIO^.OUTPUT_WORD2 := DONT_SAVE_SUM + FORCE_ZERO_OP +
0000072E 2                                   LOAD_EQ_UM;
0000073A 2
0000073A 2              (* Now, catch your breath and, while you're at it, add term
0000073A 2                 to function description *)
0000073A 2
0000073A 2              ADD_OPERAND ( FUNC_TERM, IO, CODE )
00000758 2            END (* Set up the fast sequencer *)
00000758 2  END; (* Procedure ADD_DYNAMIC *)
00000000 1
00000000 1
00000000 1
00000000 1
00000000 1
00000000 1  (*
00000000 1                           ***************************
00000000 1                           ***** DYNAMIC_FUDGE *****
00000000 1                           ***************************
00000000 1                                                                       *)
00000000 1  $GLOBPROC ONS
00000000 1  PROCEDURE DYNAMIC_FUDGE ( VAR MEAS:  CMD_DATA_ARRAY; DYN_PROG, DYN_PROC,
00000000 2                            DYN_STAT:  S_INT; VAR SYMS:  SYM_DESCRIPS );
00000000 2  (*
00000000 2    Procedure DYNAMIC_FUDGE to combine all dynamic variables for the given
00000000 2    program/procedure into one.  Procedure is a fudge because it resets
00000000 2    the symbol table to say that all the dynamics for this context are
00000000 2    adjacent.  This is definitely a cruddy hunk of code, but I no longer
00000000 2    have time to breath, much less do it right...
00000000 2
00000000 2    DYNAMIC_FUDGE uses the following routine:  TEST_BITS.
00000000 2
00000000 2    Input:  1) MEAS, the input structure to the loader indicating
```

```
00000000  2              what the measurement is
00000000  2           2) DYN_PROG, the program # of the dynamics to be combined
00000000  2           3) DYN_PROC, the procedure # of the dynamics to be combined
00000000  2           4) DYN_STAT, the type of access ( ie READ, WRITE, both )
00000000  2           5) SYMS, a list of all unique symbols involved in the
00000000  2              measurement
00000000  2    Output:  1) SYMS, an adjusted list of all symbols with all dynamics
00000000  2              of the given program/procedure combined as if adjacent
00000000  2                                                                   *)
00000000  2  VAR
00000000  2
00000000  2    I:  S_INT, (* WHILE loop index *)
00000002  2
00000002  2    LO_DYN:  S_INT; (* Index into symbol table of dynamic var with
00000004  2                      lowest address *)
00000004  2
00000004  2    HI_ADRS:  L_INT; (* Highest address of dynamic range *)
00000008  2
00000008  2    TEST_ADRS:  L_INT; (* Test high address *)
00000760  2
00000760  2  BEGIN (* Procedure DYNAMIC_FUDGE *)
00000760  2    LO_DYN := -1;
00000766  2    I := 0;
0000076A  2    WHILE I < SYMS.SYMBOL_COUNT DO
00000773  2      WITH MEAS [ SYMS.SYMBOL_ARRAY [ I ].DESCRIP_INDEX ] DO
00000798  2        BEGIN (* Combine dynamic variables for this program/procedure *)
00000798  2          IF ( TEST_BITS ( 8, FLAGS ) = TRUE ) AND
00000798  2             ( FILE_NUM = DYN_PROG ) AND ( PROC_NUM = DYN_PROC ) AND
00000798  2             ( STATUS = DYN_STAT )
000007F0  2            THEN (* This is a dynamic variable in same context *)
000007F0  2              BEGIN (* Check it against current dynamic range *)
000007F0  2                SYMS.SYMBOL_ARRAY [ I ].MEAS_SIZE := 0; (* Clear size *)
00000808  2                TEST_ADRS := ADDRESS + SIZE - 1; (* Figure max adrs *)
0000081A  2                IF LO_DYN = -1
00000826  2                  THEN (* This is the first one encountered *)
00000826  2                    BEGIN (* Initialize *)
00000826  2                      LO_DYN := I;
0000082C  2                      HI_ADRS := TEST_ADRS
00000830  2                    END (* Initialize *)
00000834  2                  ELSE (* Have seen at least one other dynamic var *)
00000834  2                    BEGIN (* Combine this one with previous ones *)
00000834  2                      IF ADDRESS < MEAS [ SYMS.SYMBOL_ARRAY [ LO_DYN ].
00000834  2                         DESCRIP_INDEX ].ADDRESS
00000864  2                        THEN (* A new low *)
00000864  2                          LO_DYN := I;
0000086A  2                      IF TEST_ADRS > HI_ADRS
00000876  2                        THEN (* A new high *)
00000876  2                          HI_ADRS := TEST_ADRS
0000087A  2                    END (* Combine this one with previous ones *)
0000087A  2              END; (* Check it against current dynamic range *)
0000087A  2          I := I + 1
0000087E  2        END; (* Combine dynamic variables for this program/procedure *)
00000882  2
00000882  2    IF LO_DYN <> -1
0000088E  2      THEN (* There was at least one dynamic variable *)
0000088E  2        WITH SYMS.SYMBOL_ARRAY [ LO_DYN ] DO
000008A2  2          MEAS_SIZE := HI_ADRS - MEAS [ DESCRIP_INDEX ].ADDRESS + 1
000008BE  2  END; (* Procedure DYNAMIC_FUDGE *)
00000000  1  $GLOBPROC OFF$
00000000  1
00000000  1
00000000  1
00000000  1
00000000  1
00000000  1  (*
00000000  1                          *************************
00000000  1                          ***** SET_TU_PATHS *****
00000000  1                          *************************
00000000  1                                                                  *)
00000000  1  $GLOBPROC ON$
00000000  1  PROCEDURE SET_TU_PATHS ( VAR VAR_REC:  CMD_DATA_TYPE; VAR_SIZE:  L_INT;
00000000  2                           ID:  S_INT; VAR HIGHS:  HIGH_LEVEL_SET;
00000000  2                           VAR SPEC:  HU_SPEC_REC; VAR IO:  I_O_REC;
00000000  2                           VAR SET_CODE:  S_INT );
00000000  2  (*
```

```
00000000 2    Procedure SET_TV_PATHS to set up the needed resource paths for the
00000000 2    given variable.  Procedure simply adds all needed paths to the given
00000000 2    I/O node one at a time.  If any path cannot be created, an error is
00000000 2    returned.
00000000 2
00000000 2    SET_TV_PATHS uses the following routines:  ADD_DYNAMIC,
00000000 2    ASSIGN_LL_RSRC, ADD_PATH, TEST_BITS, GET_VALUE_MASK, GET_BUS_MASK,
00000000 2    and P_ADDR.
00000000 2
00000000 2    Input:  1) VAR_REC, the record describing the variable to be
00000000 2               traced
00000000 2            2) VAR_SIZE, the size of the variable to be traced
00000000 2            3) ID, the basis for the resource I.D.s to be assigned to
00000000 2               the paths ( if 0, the opcode resource is turned on )
00000000 2            4) HIGHS, the set of possible high level resources to choose
00000000 2               from when creating the paths
00000000 2            5) SPEC, the current hardware specification
00000000 2            6) IO, the input/output record to add the paths to
00000000 2    Output:  1) SPEC, the modified hardware specification from which the
00000000 2                resources were allocated
00000000 2             2) IO, the modified input/output record
00000000 2             3) SET_CODE, a return code describing how it went:
00000000 2                 -6 indicates function overflow
00000000 2                 -5 indicates out of fast sequencer resources
00000000 2                 -4 indicates out of high level hardware resources
00000000 2                 -3 indicates out of low level hardware resources
00000000 2                  0 indicates no error:  all assignments completed
00000000 2                                                                      *)
00000000 2  VAR
00000000 2
00000000 2    STATUS_VALUE:  L_INT; (* Processor value for status *)
00000004 2
00000004 2    STATUS_MASK:  L_INT; (* Processor value for mask *)
00000008 2
00000008 2    ADDR_MASK:  L_INT; (* Processor mask for address bus *)
0000000C 2
0000000C 2    RSRC_VALUE1:  L_INT; (* Lower value to load resource with *)
00000010 2
00000010 2    RSRC_VALUE2:  L_INT; (* Upper value to load resource with *)
00000014 2
00000014 2    RSRC_MASK1:  L_INT; (* Lower mask to load resource with *)
00000018 2
00000018 2    RSRC_MASK2:  L_INT; (* Upper mask to load resource with *)
0000001C 2
0000001C 2    NEXT_LL:  S_INT; (* Next assigned low level resource *)
000008C6 2
000008C6 2  BEGIN (* Procedure SET_TV_PATHS *)
000008C6 2    SET_CODE := NO_ERROR; (* Be optimistic *)
000008CC 2
000008CC 2    (* Get processor specific values/masks *)
000008CC 2
000008CC 2    GET_VALUE_MASK ( OPCODE, STATUS_VALUE, STATUS_MASK );
000008E4 2    ADDR_MASK := GET_BUS_MASK ( 0 );
000008F2 2
000008F2 2    (* Turn on opcode resource if necessary *)
000008F2 2
000008F2 2    IF ID = 0
000008FA 2      THEN (* First time through:  turn it on *)
000008FA 2        NEXT_LL := ASSIGN_LL_RSRC ( OPCODE_EQUATE, 999, STATUS_VALUE+
000008FA 2                                    ADDR_MASK, STATUS_MASK, 0, 0,
000008FA 2                                    SPEC.LOW_LEVELS );
0000092A 2
0000092A 2    (* Get resource to watch variable *)
0000092A 2
0000092A 2    (* Get processor specific value/mask for given status *)
0000092A 2    GET_VALUE_MASK ( VAR_REC.STATUS, STATUS_VALUE, STATUS_MASK );
00000946 2
00000946 2    IF TEST_BITS ( 8, VAR_REC.FLAGS ) = TRUE
00000968 2      THEN (* Dynamic variable *)
00000968 2        (* Set up to trace a dynamic variable *)
00000968 2        ADD_DYNAMIC ( VAR_REC, VAR_SIZE, STATUS_VALUE, STATUS_MASK,
00000968 2                      SPEC.MISC_SIGNALS [ FSR ], SPEC.FAST_SEQUENCER,
00000968 2                      IO, SET_CODE )
000009A4 2      ELSE (* Static variable *)
000009A4 2        BEGIN (* Set up to trace a static variable *)
```

```
000009A4  2          (* Logical --> physical *)
000009A4  2          P_ADDR ( VAR_REC.ADDRESS, RSRC_VALUE1 );
000009B8  2          RSRC_VALUE1 := RSRC_VALUE1 + STATUS_VALUE;
000009C0  2          RSRC_MASK1 := STATUS_MASK + ADDR_MASK;
000009CC  2          (* Look for odd address *)
000009CC  2          IF ODD ( RSRC_VALUE1 ) = TRUE
000009E2  2            THEN (* Address is odd *)
000009E2  2              RSRC_MASK1 := RSRC_MASK1 - 1; (* Don't care LSB of adrs *)
000009E6  2          RSRC_VALUE2 := RSRC_VALUE1 + VAR_SIZE - 1;
000009F4  2          RSRC_MASK2 := STATUS_MASK + ADDR_MASK;
00000A00  2          ADD_PATH ( ADDRESS_RANGE, ID, RSRC_VALUE1, RSRC_MASK1,
00000A00  2                     RSRC_VALUE2, RSRC_MASK2, HIGHS, SPEC.LOW_LEVELS,
00000A00  2                     SPEC.HIGH_LEVELS, IG, SET_CODE )
00000A40  2        END (* Set up to trace a static variable *)
00000A40  2  END; (* Procedure SET_TU_PATHS *)
00000000  1  $GLOBPROC OFF$
00000000  1
00000000  1
00000000  1
00000000  1
00000000  1
00000000  1  (*
00000000  1                          ***************************
00000000  1                          ***** FIX_TU_INDECES *****
00000000  1                          ***************************
00000000  1                                                                      *)
00000000  1  $GLOBPROC ON$
00000000  1  PROCEDURE FIX_TU_INDECES ( VAR MEAS_STRUCT:  CMD_DATA_ARRAY; VAR
00000000  2                             SYM_STRUCT:  SYM_DESCRIPS; VAR SEXTET:
00000000  2                             SEXTET_REC_TYPE; DATA_TYPE, DYN_PROG,
00000000  2                             DYN_PROC:  S_INT; VAR CUR_STACK, M_FIELD:
00000000  2                             L_INT; VAR INDECES:  S_INT );
00000000  2  (*
00000000  2    Procedure FIX_TU_INDECES to set up the low and high byte indeces for
00000000  2    a captured sextet.  Procedure cases off the type of data captured,
00000000  2    then finds the appropriate symbol index for each byte of the data.
00000000  2    If the data does map to a symbol but the access was not the correct
00000000  2    type, the appropriate index is set to indicate no symbol mapping was
00000000  2    found.
00000000  2
00000000  2    Note:  odd addresses map to the low byte, even addresses map to the
00000000  2           high byte!
00000000  2
00000000  2    FIX_TU_INDECES uses the following routines:  TEST_BITS, FIND_STATIC,
00000000  2    and FIND_DYNAMIC.
00000000  2
00000000  2    Input:  1) MEAS_STRUCT, the structure describing the measurement
00000000  2            2) SYM_STRUCT, a list of all unique symbols involved in the
00000000  2               measurement
00000000  2            3) SEXTET, the captured sextet for which indeces are to be
00000000  2               found for its lower and upper byte addresses
00000000  2            4) DATA_TYPE, the type of data contained in the sextet, ie
00000000  2               static, dynamic, stack, etc
00000000  2            5) DYN_PROG, the program # for dynamic variables
00000000  2            6) DYN_PROC, the procedure # for dynamic variables
00000000  2            7) CUR_STACK, the current stack for dynamic variables, or
00000000  2               -1 if no stack has been found yet
00000000  2    Output:  1) CUR_STACK, the updated current stack for dynamic variables
00000000  2             2) M_FIELD, the multi-field for writing an appropriate
00000000  2                trace record out to the disc
00000000  2             3) INDECES, the packed indeces into the symbol table for the
00000000  2                lower ( odd ) and upper ( even ) bytes of data for the
00000000  2                address in the given sextet ( 0FFH in a byte indicates
00000000  2                that byte does not map to a symbol )
00000000  2                                                                      *)
00000000  2  VAR
00000000  2
00000000  2    LO_INDEX:  S_INT; (* Index into symbol table to symbol info for
00000002  2                         lower ( odd ) byte *)
00000002  2
00000002  2    HI_INDEX:  S_INT; (* Index into symbol table to symbol info for
```

```
00000004  2                    upper ( even ) byte *)
00000004  2
00000004  2    ACCESS:  S_INT; (* Type of access to symbol *)
00000A48  2
00000A48  2  BEGIN (* Procedure FIX_TO_INDECES *)
00000A48  2    (* Assume no symbols associated with the data *)
00000A48  2    LO_INDEX := -1;
00000A4E  2    HI_INDEX := -1;
00000A54  2    M_FIELD := 0;
00000A5A  2
00000A5A  2   (* Take action based on data type *)
00000A5A  2
00000A5A  2    CASE DATA_TYPE OF
00000A64  2      STATIC_VAR:
00000A64  2        BEGIN (* Find associated symbols *)
00000A64  2          IF TEST_BITS ( 2, SEXTET.STATUS ) = TRUE
00000A86  2            THEN (* Byte access *)
00000A86  2              IF TEST_BITS ( 4, SEXTET.STATUS ) = TRUE
00000AA8  2                THEN (* Upper byte access:  find upper byte symbol *)
00000AA8  2                  HI_INDEX := FIND_STATIC ( MEAS_STRUCT, SYM_STRUCT,
00000AA8  2                                            SEXTET.ADRS )
00000AD0  2                ELSE (* Lower byte access:  find lower byte symbol *)
00000AD0  2                  LO_INDEX := FIND_STATIC ( MEAS_STRUCT, SYM_STRUCT,
00000AD0  2                                            SEXTET.ADRS )
00000AF8  2            ELSE (* Word access *)
00000AF8  2              BEGIN (* Find symbols for both bytes *)
00000AF8  2                LO_INDEX := FIND_STATIC ( MEAS_STRUCT, SYM_STRUCT,
00000AF8  2                                          SEXTET.ADRS+1 );
00000B20  2                HI_INDEX := FIND_STATIC ( MEAS_STRUCT, SYM_STRUCT,
00000B20  2                                          SEXTET.ADRS )
00000B44  2              END (* Find symbols for both bytes *)
00000B44  2        END; (* Find associated symbols *)
00000B48  2      DYNAMIC_VAR:
00000B48  2        IF CUR_STACK <> -1
00000B58  2          THEN (* Have captured the stack address *)
00000B58  2            BEGIN (* Find associated symbols *)
00000B58  2              IF TEST_BITS ( 2, SEXTET.STATUS ) = TRUE
00000B7A  2                THEN (* Byte access *)
00000B7A  2                  IF TEST_BITS ( 4, SEXTET.STATUS ) = TRUE
00000B9C  2                    THEN (* Upper byte access:  find upper byte symbol *)
00000B9C  2                      HI_INDEX := FIND_DYNAMIC ( MEAS_STRUCT, SYM_STRUCT,
00000B9C  2                                      SEXTET.ADRS-CUR_STACK,
00000B9C  2                                      DYN_PROG, DYN_PROC )
00000BD4  2                    ELSE (* Lower byte access:  find lower byte symbol *)
00000BD4  2                      LO_INDEX := FIND_DYNAMIC ( MEAS_STRUCT, SYM_STRUCT,
00000BD4  2                                      SEXTET.ADRS-CUR_STACK,
00000BD4  2                                      DYN_PROG, DYN_PROC )
00000C0C  2                ELSE (* Word access *)
00000C0C  2                  BEGIN (* Find symbols for both bytes *)
00000C0C  2                    LO_INDEX := FIND_DYNAMIC ( MEAS_STRUCT, SYM_STRUCT,
00000C0C  2                                    SEXTET.ADRS-CUR_STACK+1,
00000C0C  2                                    DYN_PROG, DYN_PROC );
00000C42  2                    HI_INDEX := FIND_DYNAMIC ( MEAS_STRUCT, SYM_STRUCT,
00000C42  2                                    SEXTET.ADRS-CUR_STACK,
00000C42  2                                    DYN_PROG, DYN_PROC )
00000C76  2                  END; (* Find symbols for both bytes *)
00000C76  2              M_FIELD := CUR_STACK
00000C80  2            END; (* Find associated symbols *)
00000C94  2      STACK_ADRS:
00000C94  2        (* Update current stack *)
00000C94  2        CUR_STACK := SEXTET.ADRS;
00000C94  2      OTHERWISE
00000C94  2        (* Do nothing *)
00000C94  2    END; (* Of case statement *)
00000CBE  2
00000CBE  2   (* See what data should really be written out to the trace file *)
00000CBE  2
00000CBE  2    IF TEST_BITS ( 1, SEXTET.STATUS ) = TRUE
00000CE0  2      THEN (* This was a write access *)
00000CE0  2        ACCESS := WRITE
00000CEA  2      ELSE (* This was a read access *)
00000CEA  2        ACCESS := READ;
00000CF0  2    IF LO_INDEX <> -1
00000CFC  2      THEN (* There is a lower byte symbol:  make sure we want it *)
```

```
00000CFC  2        WITH MEAS_STRUCT [ SYM_STRUCT.SYMBOL_ARRAY [ LO_INDEX ].
00000CFC  2             DESCRIP_INDEX ] DO
00000D1C  2           IF  ( STATUS <> ACCESS ) AND ( STATUS <> READ_WRITE )
00000D3E  2             THEN (* Don't want this byte *)
00000D3E  2              LO_INDEX := -1;
00000D44  2    IF HI_INDEX <> -1
00000D50  2      THEN (* There is an upper byte symbol:  make sure we want it *)
00000D50  2        WITH MEAS_STRUCT [ SYM_STRUCT.SYMBOL_ARRAY [ HI_INDEX ].
00000D50  2             DESCRIP_INDEX ] DO
00000D70  2           IF  ( STATUS <> ACCESS ) AND ( STATUS <> READ_WRITE )
00000D92  2             THEN (* Don't want this byte *)
00000D92  2              HI_INDEX := -1;
00000D98  2
00000D98  2    (* Shift both indeces together *)
00000D98  2
00000D98  2    INDECES := SHIFT ( HI_INDEX, 8 ) + SHIFT ( SHIFT ( LO_INDEX, 8 ), -8 )
00000DAE  2  END; (* Procedure FIX_TV_INDECES *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $TITLE "Soda Dynamic Controller:  Trace Modules"
00000000  1  PROGRAM TRACE_MODS;
00000000  1  (*
00000000  1  ******************************** TRACE_MODS ********************************
00000000  1    TRACE_MODS is the module containing the routines for the load pre-
00000000  1    processor and the unload post-processor for the trace modules
00000000  1    measurement.  For pre-processing, the user measurement data structure
00000000  1    is translated to reflect a trace modules measurement.  For post-
00000000  1    processing, the measurement data is unloaded from the hardware,  all
00000000  1    garbage is removed, and the current trace file is updated with all
00000000  1    valid measurement data.
00000000  1    Author:  Kip Fulghum
00000000  1    Date:  6-2-83  Revised:  1-9-85
00000000  1  ****************************************************************************
00000000  1
00000000  1    TRACE_MODS contains the following routines:
00000000  1    -Global procedure LOAD_TM is the pre-processor for the trace modules
00000000  1     measurement.  It loads the appropriate data structures with the
00000000  1     necessary information to create a trace modules measurement when
00000000  1     loaded into the hardware.
00000000  1    -Global procedure UNLOAD_TM is the post-processor for the trace
00000000  1     modules measurement.  It unloads the hardware one sextuplet at
00000000  1     a time, classifies the data, and creates valid trace file data
00000000  1     records.
00000000  1
00000000  1    In addition, TRACE_MODS uses the following external routines:
00000000  1    START_GEN, CLOSE_OR_NODE, CLOSE_IO_LIST,
00000000  1    HOW_MUCH_DATA, GET_DATA, FIND STATIC, WRITE ANLYS_REC,
00000000  1    UNLOAD_MSG, UNLOAD_DONE,
00000000  1    CLASS_PROC_DATA,
00000000  1    SET_TM_PATHS, and FIX_TM_INDENT.
00000000  1                                                                        *)
00000000  1  (*
00000000  1                           ***************************
00000000  1                           ***** Include Files *****
00000000  1                           ***************************
00000000  1                                                                        *)
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMCH
00000000  1
00000000  1  #INCLUDE FM_TYPES:SS_DYN
```

```
00000000 1
00000000 1 VAR
00000000 1
00000000 1   PREV_TYPE:  S_INT; (* Type of data in previous hardware sextet *)
00000002 1
00000002 1   CUR_INDENT:  S_INT; (* Current module indentation *)
00000004 1
00000004 1 SEXTVAR ONS
00000004 1
00000004 1   FOOTDC_INFO:  FOOTDC_INFO_TYPE; (* Trace file information *)
00000004 1
00000004 1 SEXTVAR OFFS
00000004 1
00000004 1   (* The above program level variables must be initialized by the
00000004 1      pre-processor prior to being used by the post-processor *)
00000004 1
00000004 1
00000004 1
00000004 1
00000004 1
00000004 1 SCALL_ABS_LONGS
00000000 1 (*
00000000 1                          ***********************
00000000 1                          ***** START_GEN *****
00000000 1                          ***********************
00000000 1                                                                   *)
00000000 1 PROCEDURE START_GEN ( VAR GENERATOR:  FUNC_RESOURCE; START_STATE,
00000000 2                       NEXT_STATE:  S_INT; VAR STATE_PTR:  STATE_REC_PTR;
00000000 2                       VAR IO_PTR:  I_O_REC_PTR; VAR HIGH_SET:
00000000 2                       HIGH_LEVEL_SET ); EXTERNAL;
00000000 1 (*
00000000 1   Procedure START_GEN to prepare a function generator for use.
00000000 1   Provided as a Pascal external.
00000000 1                                                                   *)
00000000 1
00000000 1
00000000 1
00000000 1
00000000 1
00000000 1
00000000 1 (*
00000000 1                          **************************
00000000 1                          ***** CLOSE_OR_NODE *****
00000000 1                          **************************
00000000 1                                                                   *)
00000000 1 PROCEDURE CLOSE_OR_NODE ( FINAL_OUTS:  OUT_SET_TYPE; VAR IO:  I_O_REC;
00000000 2                           VAR CLOSE_CODE:  S_INT ); EXTERNAL;
00000000 1 (*
00000000 1   Procedure CLOSE_OR_NODE to close out a function generator I/O node
00000000 1   consisting of a number of ORed terms.  Provided as a Pascal external.
00000000 1                                                                   *)
00000000 1
00000000 1
00000000 1
00000000 1
00000000 1
00000000 1
00000000 1 (*
00000000 1                          **************************
00000000 1                          ***** CLOSE_IO_LIST *****
00000000 1                          **************************
00000000 1                                                                   *)
00000000 1 PROCEDURE CLOSE_IO_LIST ( DC_STATE:  S_INT; DC_OUTS:  OUT_SET_TYPE;
00000000 2                           VAR LAST_IO:  I_O_REC ); EXTERNAL;
00000000 1 (*
00000000 1   Procedure CLOSE_IO_LIST to close out a function generator I/O list
00000000 1   with a don't care I/O node.  Provided as a Pascal external.
00000000 1                                                                   *)
00000000 1
00000000 1
00000000 1
00000000 1
00000000 1
00000000 1
00000000 1 (*
00000000 1                          ***************************
00000000 1                          ***** HOW_MUCH_DATA *****
00000000 1                          ***************************
00000000 1
```

```
00000000 1                                                              *)
00000000 1  PROCEDURE HOW_MUCH_DATA ( VAR FLAGS:  FLAG_ARRAY_TYPE; VAR FEAT_ARRAY:
00000000 2                          FEAT_ARRAY_TYPE; START_MAC, END_MAC:  S_INT;
00000000 2                          VAR START_STATE, NUM_STATES:  S_INT );
00000000 2                          EXTERNAL;
00000000 1  (*
00000000 1   Procedure HOW_MUCH_DATA to determine how much data was captured and
00000000 1   starting from where.  Provided as a Pascal external.
00000000 1                                                              *)
00000000 1
00000000 1
00000000 1
00000000 1
00000000 1
00000000 1  (*
00000000 1                      *********************
00000000 1                      ***** GET_DATA *****
00000000 1                      *********************
00000000 1                                                              *)
00000000 1  PROCEDURE GET_DATA ( START_STATE, UN_COUNTER:  S_INT; VAR FEAT_ARRAY:
00000000 2                    FEAT_ARRAY_TYPE; VAR BASE:  DOUBLE_ARRAY; VAR
00000000 2                    SEXTET:  SEXTET_REC_TYPE ); EXTERNAL;
00000000 1  (*
00000000 1   Procedure GET_DATA to retrieve a sextet worth of data out of
00000000 1   acquisition memory, translate the emulation data to generic data,
00000000 1   and decode the captured grey-code count.  Provided as a Pascal
00000000 1   external.
00000000 1                                                              *)
00000000 1
00000000 1
00000000 1
00000000 1
00000000 1
00000000 1  (*
00000000 1                      ***********************
00000000 1                      ***** FIND_STATIC *****
00000000 1                      ***********************
00000000 1                                                              *)
00000000 1  FUNCTION FIND_STATIC ( VAR MEAS_STRUCT:  CMD_DATA_ARRAY; VAR
00000000 2                      SYM_STRUCT:  SYM_DESCRIPS; EMUL_ADRS:  L_INT ):
00000000 2                      S_INT; EXTERNAL;
00000000 1  (*
00000000 1   Function FIND_STATIC returns the index of the record in the
00000000 1   symbol table structure related to the given static data.  Provided
00000000 1   as a Pascal external.
00000000 1                                                              *)
00000000 1
00000000 1
00000000 1
00000000 1
00000000 1
00000000 1  (*
00000000 1                      ****************************
00000000 1                      ***** WRITE_ANLYS_REC *****
00000000 1                      ****************************
00000000 1                                                              *)
00000000 1  PROCEDURE WRITE_ANLYS_REC ( D_TYPE, INDEX:  S_INT; N_FIELD:  L_INT; VAR
00000000 2                           SEX_REC:  SEXTET_REC_TYPE; VAR REC_COUNT,
00000000 2                           FMGR_CODE:  S_INT ); EXTERNAL;
00000000 1  (*
00000000 1   Procedure WRITE_ANLYS_REC to create and write a trace file analysis
00000000 1   record to the disc.  Provided as a Pascal external.
00000000 1                                                              *)
00000000 1
00000000 1
00000000 1
00000000 1
00000000 1
00000000 1  (*
00000000 1                      **********************
00000000 1                      ***** UNLOAD_MSG *****
00000000 1                      **********************
00000000 1                                                              *)
00000000 1  PROCEDURE UNLOAD_MSG ( STATE:  S_INT ); EXTERNAL;
00000000 1  (*
```

```
00000000 1    Procedure UNLOAD_MSG to update the current unload message with the
00000000 1    given count.  Provided as a Pascal external.
00000000 1                                                                      *)
00000000 1
00000000 1
00000000 1
00000000 1
00000000 1
00000000 1  (*
00000000 1                          ************************
00000000 1                          ***** UNLOAD_DONE *****
00000000 1                          ************************
00000000 1                                                                      *)
00000000 1  FUNCTION UNLOAD_DONE ( COUNT:  S_INT ):  BOOLEAN; EXTERNAL;
00000000 1  (*
00000000 1    Function UNLOAD_DONE to determine when the unload sequence is done.
00000000 1    Provided as a Pascal external.
00000000 1                                                                      *)
00000000 1
00000000 1
00000000 1
00000000 1
00000000 1
00000000 1  (*
00000000 1                          ****************************
00000000 1                          ***** CLASS_PROC_DATA *****
00000000 1                          ****************************
00000000 1                                                                      *)
00000000 1  FUNCTION CLASS_PROC_DATA ( VAR PROC_REC:  CMD_DATA_TYPE; ADRS, PREV_PC,
00000000 2                             NEXT_PC:  L_INT ):  S_INT; EXTERNAL;
00000004 1  (*
00000004 1    Function CLASS_PROC_DATA to determine what type of procedural data
00000004 1    was captured.  Provided as a Pascal external.
00000004 1                                                                      *)
00000004 1
00000004 1
00000004 1
00000004 1
00000004 1
00000004 1  %CALL_PC_SHORTS
00000000 1  (*
00000000 1                          *************************
00000000 1                          ***** SET_TM_PATHS *****
00000000 1                          *************************
00000000 1                                                                      *)
00000000 1  PROCEDURE SET_TM_PATHS ( VAR PROC_REC:  CMD_DATA_TYPE; ID:  S_INT;
00000000 2                           VAR HIGHS:  HIGH_LEVEL_SET; VAR SPEC:
00000000 2                           HW_SPEC_REC; VAR IO:  I_O_REC: VAR NEED_ENTRY:
00000000 2                           BOOLEAN; VAR SET_CODE:  S_INT ); EXTERNAL;
00000000 1  (*
00000000 1    Procedure SET_TM_PATHS to set up the needed resource paths for the
00000000 1    given procedure.  Provided as a Pascal external.
00000000 1                                                                      *)
00000000 1
00000000 1
00000000 1
00000000 1
00000000 1
00000000 1  (*
00000000 1                          **************************
00000000 1                          ***** FIX_TM_INDENT *****
00000000 1                          **************************
00000000 1                                                                      *)
00000000 1  PROCEDURE FIX_TM_INDENT ( THIS_ONE:  S_INT; VAR LAST_ONE. MIN_IN.
00000000 2                            CUR_IN:  S_INT ); EXTERNAL;
00000004 1  (*
00000004 1    Procedure FIX_TM_INDENT to keep track of the current and minimum
00000004 1    module indentations for trace modules.  Provided as a Pascal external.
00000004 1                                                                      *)
00000004 1
00000004 1
00000004 1
00000004 1
00000004 1
```

```
00000004  1  (*
00000004  1                              ******************
00000004  1                              ***** LOAD_TM *****
00000004  1                              ******************
00000004  1                                                                        *)
00000004  1  $GLOBPROC ON$
00000000  1  PROCEDURE LOAD_TM ( VAR MEAS_:  CMD_DATA_ARRAY; VAR SYMS_:
00000000  2                      SYM_DESCRIPS; VAR SPEC_:  HW_SPEC_REC; VAR R_CODE:
00000000  2                      S_INT );
00000000  2  (*
00000000  2    Procedure LOAD_TM is the pre-processor for the trace modules
00000000  2    measurement.  It loads the appropriate hardware data structures with
00000000  2    the necessary information to create a trace modules measurement when
00000000  2    loaded into the hardware.  Procedure goes through the entire symbol
00000000  2    table, assigning equate resources to all procedure entry/exit points,
00000000  2    then builds the function description for the state machine in
00000000  2    post-fix notation.  If one function generator is filled, the
00000000  2    procedure switches to the next function generator.  If at any time
00000000  2    during the process a required resource is not available, the
00000000  2    translation is aborted and an appropriate error code is returned to
00000000  2    the caller.
00000000  2
00000000  2    LOAD_TM uses the following routines:  START_GEN, CLOSE_OR_NODE,
00000000  2    CLOSE_IO_LIST, and SET_TM_PATHS
00000000  2
00000000  2    Input:  1) MEAS_, the input structure to the loader indicating
00000000  2               what the measurement is
00000000  2            2) SYMS_, a list of all unique symbols involved in the
00000000  2               measurement ( ie procedures )
00000000  2            3) SPEC_, the initialized hardware specification structure
00000000  2    Output:  1) SPEC_, the completed hardware record containing
00000000  2                specifications for usage of the:
00000000  2                a) low level resources,
00000000  2                b) high level resources,
00000000  2                c) fast sequencer,
00000000  2                d) micro-code occurance counters,
00000000  2                e) function generators,
00000000  2                f) misc. signals,
00000000  2                g) occurance counters,
00000000  2                h) extraneous features
00000000  2             2) R_CODE, a code specifying how the load turned out:
00000000  2                 -6 indicates translation error:  function description
00000000  2                    overflow
00000000  2                 -4 indicates out of high level hardware resources
00000000  2                 -3 indicates out of low level hardware resources
00000000  2                  0 indicates no error:  load completed
00000000  2                                                                        *)
00000000  2  VAR
00000000  2
00000000  2    PROC_INDEX:  S_INT; (* Index into cmd stack of procedure *)
00000002  2
00000002  2    I:  S_INT; (* WHILE loop index *)
00000004  2
00000004  2    STATE:  STATE_REC_PTR; (* Current function generator state node *)
00000008  2
00000008  2    IO:  I_O_REC_PTR; (* Current function generator input/output node *)
0000000C  2
0000000C  2    HL_SET:  HIGH_LEVEL_SET; (* Current set of useable high level
0000000E  2                                resources *)
0000000E  2
0000000E  2    ADD_ENTRY:  BOOLEAN; (* Flag indicating proc entry path is needed -
00000004  2                           used when switching generators *)
00000004  2
00000004  2  BEGIN (* Procedure LOAD_TM *)
00000004  2    R_CODE := NO_ERROR; (* Be optimistic *)
0000000A  2
0000000A  2    (* Initialize variables for post-processor *)
0000000A  2
0000000A  2    (* DON'T initialize FOOTDC_INFO.MIN_INDENT here because of windows! *)
0000000A  2    CUR_INDENT := 0;
0000000E  2    PREV_TYPE := GARBAGE; (* No previous entries or exits *)
00000014  2
00000014  2    (* Start state machine:  use Y generator first *)
00000014  2
```

```
00000014  2    START_GEN ( SPEC_.FUNC_GENERATORS [ Y ], 0, 0. STATE, IO, HL_SET );
0000003C  2
0000003C  2    (* Take a deep breath:  we're going down for a long, long time *)
0000003C  2
0000003C  2    ADD ENTRY := TRUE;
00000042  2    I := 0;
00000046  2    WHILE ( I < SYMS_.SYMBOL_COUNT ) AND ( R_CODE = NO_ERROR ) DO
00000068  2      BEGIN (* Set up resources to watch all proc entries/exits *)
00000068  2
00000068  2        (* Assign all the necessary resources and add to I/O node *)
00000068  2
00000068  2        PROC_INDEX := SYMS_.SYMBOL_ARRAY [ I ].DESCRIP_INDEX;
0000007A  2        SET_TM_PATHS ( MEAS_ [ PROC_INDEX ], I, HL_SET, SPEC_, IO^,
0000007A  2                       ADD_ENTRY, R_CODE );
000000B2  2        IF R_CODE = NO_ERROR
000000BC  2          THEN (* Will need to add an entry on next pass thru *)
000000BC  2            ADD_ENTRY := TRUE;
000000C2  2
000000C2  2        (* Switch generators if necessary *)
000000C2  2
000000C2  2        IF ( R_CODE = OUT_OF_H_RSRCS ) AND ( SPEC_.
000000C2  2             FUNC_GENERATORS [ X ].STATE_MACH_PTR = NIL )
000000EA  2          THEN (* Time to change function generators *)
000000EA  2            BEGIN (* Switch to X function generator *)
000000EA  2              (* Close out Y *)
000000EA  2              CLOSE_OR_NODE ( [ STORE, COUNT ], IO^, R_CODE );
00000106  2              CLOSE_IO_LIST ( 0, [ COUNT ], IO^ );
0000011A  2              (* Open up X *)
0000011A  2              START_GEN ( SPEC_.FUNC_GENERATORS [ X ], 0, 0, STATE, IO,
0000011A  2                          HL_SET );
00000140  2              I := I - 1 (* Back up one and try again *)
00000144  2            END; (* Switch to X function generator *)
00000144  2        I := I + 1
00000148  2      END; (* Set up resources to watch all proc entries/exits *)
0000014C  2
0000014C  2    (* Close out the last function generator *)
0000014C  2
0000014C  2    IF R_CODE = NO_ERROR
00000156  2      THEN (* All went well *)
00000156  2        BEGIN (* Close out this function generator *)
00000156  2          CLOSE_OR_NODE ( [ STORE, COUNT ], IO^, R_CODE );
00000172  2          CLOSE_IO_LIST ( 0, [ COUNT ], IO^ )
00000186  2        END (* Close out this function generator *)
00000186  2  END; (* Procedure LOAD_TM *)
00000000  1  $CLOBPROC OFF$
00000000  1
00000000  1
00000000  1
00000000  1
00000000  1
00000000  1  (*
00000000  1                            ***********************
00000000  1                            ***** UNLOAD_TM *****
00000000  1                            ***********************
00000000  1                                                                         *)
00000000  1  $CLOBPROC ON$
00000000  1  PROCEDURE UNLOAD_TM ( VAR MEAS_:  CMD_DATA_ARRAY; VAR SYMS_:
00000000  2                        SYM_DESCRIPS; VAR FLAGS_:  FLAG_ARRAY_TYPE; MAC_:
00000000  2                        S_INT; VAR SPEC_:  HW_SPEC_REC; VAR UNLD_COUNT,
00000000  2                        R_CODE:  S_INT );
00000000  2  (*
00000000  2    Procedure UNLOAD_TM is the post-processor for the trace modules
00000000  2    measurement.  It unloads the hardware one sextuplet at a time,
00000000  2    classifies the data, and creates valid trace file data records.
00000000  2    If the data relates to a symbol, the correct mapping to the symbol
00000000  2    table is also made ( ie data to procedure mapping ).
00000000  2
00000000  2    UNLOAD_TM uses the following routines:  HOW_MUCH_DATA, GET_DATA,
00000000  2    FIND_STATIC, WRITE_ANLYS_REC, UNLOAD_MSG, UNLOAD_DONE,
00000000  2    CLASS_PROC_DATA, and FIX_TM_INDENT.
00000000  2
00000000  2    Input:  1) MEAS_, the structure describing the measurement at a high
00000000  2               level
00000000  2            2) SYMS_, a list of all unique symbols involved in the
00000000  2               measurement ( ie procedures )
```

```
00000000 2            3) FLAGS_, the flag word data structure containing the
00000000 2               most recently read hardware flags
00000000 2            4) MAC_, the memory address counter off the memory board
00000000 2               obtained before unloading began
00000000 2            5) SPEC_, the hardware specification which captured the
00000000 2               data
00000000 2            6) UNLD_COUNT, the previous # of states unloaded and
00000000 2               shipped out to the trace file
00000000 2    Output: 1) SPEC_, the possibly modified hardware specification
00000000 2               structure - Not modified by UNLOAD_TM!
00000000 2            2) UNLD_COUNT, the updated # of states unloaded and output
00000000 2               to the trace file
00000000 2            3) R_CODE, the return code indicating how things turned out:
00000000 2                 0 indicates no error:  data records completed
00000000 2                 1 indicates end of file ( should never happen )
00000000 2                 2 indicates invalid disc ( should never happen )
00000000 2                 3 indicates file not found:  invalid DCB ( should never
00000000 2                   happen )
00000000 2                 5 indicates no free pages available
00000000 2                 7 indicates file corrupt
00000000 2                                                                   *)
00000000 2  VAR
00000000 2
00000000 2    START_LOCATION:  S_INT; (* First location to unload *)
00000002 2
00000002 2    NUM_LOCATIONS:  S_INT; (* Number of locations to unload *)
00000004 2
00000004 2    MEM_COUNT:  S_INT; (* Memory unload count *)
00000006 2
00000006 2    CURRENT_BASE:  DOUBLE_ARRAY; (* Storage for current base count *)
0000000E 2
0000000E 2    SEXTET_REC:  SEXTET_REC_TYPE; (* Storage for unloaded hw sextet *)
00000024 2
00000024 2    SYMBOL_INDEX:  S_INT; (* Index into symbol table to symbol info
00000026 2                             for hardware sextet *)
00000026 2
00000026 2    CUR_TYPE:  S_INT; (* Type of data in hardware sextet *)
00000028 2
00000028 2    LONG_INDENT:  L_INT; (* Long integer version of CUR_INDENT *)
0000018E 2
0000018E 2  BEGIN (* Procedure UNLOAD_TM *)
0000018E 2    R_CODE := NO_ERROR; (* Be optimistic *)
00000194 2
00000194 2    (* Figure out how much to unload *)
00000194 2
00000194 2    HOW_MUCH_DATA ( FLAGS_, SPEC_.FEATURES, SPEC_.START_MAC, MAC_,
00000194 2                    START_LOCATION, NUM_LOCATIONS );
000001BE 2
000001BE 2    (* Now, unload it all *)
000001BE 2
000001BE 2    MEM_COUNT := 1;
000001C4 2    WHILE ( MEM_COUNT <= NUM_LOCATIONS ) AND ( R_CODE = NO_ERROR ) AND
000001C4 2          ( UNLOAD_DONE ( UNLD_COUNT ) = FALSE ) DO
000001FE 2      BEGIN (* Unload a sextet and create an equivalent data record *)
000001FE 2        UNLOAD_MSG ( MEM_COUNT );
00000208 2
00000208 2        (* Pull a sextet out of the hardware *)
00000208 2
00000208 2        GET_DATA ( START_LOCATION, MEM_COUNT, SPEC_.FEATURES,
00000208 2                   CURRENT_BASE, SEXTET_REC );
0000022C 2
0000022C 2        (* Map data to a symbol *)
0000022C 2
0000022C 2        SYMBOL_INDEX := FIND_STATIC ( MEAS_, SYMS_, SEXTET_REC.ADRS );
0000024C 2        IF SYMBOL_INDEX <> -1
00000258 2          THEN (* Data maps to a procedure *)
00000258 2            (* See what we got:  entry or exit *)
00000258 2            CUR_TYPE := CLASS_PROC_DATA ( MEAS_ [ SYMS_.SYMBOL_ARRAY
00000258 2                          [ SYMBOL_INDEX ].DESCRIP_INDEX ],
00000258 2                          SEXTET_REC.ADRS, SEXTET_REC.PC, -1 )
00000296 2          ELSE (* No matching symbol *)
00000296 2            CUR_TYPE := GARBAGE;
0000029C 2
0000029C 2        (* Ship it *)
0000029C 2
```

```
500 0000029C  2        IF ( CUR_TYPE = PROC_ENTRY ) OR ( CUR_TYPE = PROC_EXIT )
501 000002DA  2          THEN (* This is not garbage *)
502 000002DA  2            BEGIN (* Do it to it *)
503 000002EA  2              FIX_TM_INDENT ( CUR_TYPE, PREV_TYPE, FOOTDC_INFO.MIN_INDENT,
504 000002DA  2                              CUR_INDENT );
505 000002D2  2              LONG_INDENT := CUR_INDENT;
506 000002DC  2              (* Set MSW = 0 *)
507 000002DC  2              LONG_INDENT := SHIFT ( SHIFT ( LONG_INDENT, 16 ), -16 );
508 000002EA  2              WRITE_ANLYS_REC ( CUR_TYPE, SYMBOL_INDEX, LONG_INDENT,
509 000002EA  2                                SEXTET_REC, UNLD_COUNT, R_CODE )
510 00000310  2            END; (* Do it to it *)
511 00000310  2        MEM_COUNT := MEM_COUNT + 1
512 00000314  2      END; (* Unload a sextet and create an equivalent data record *)
513 00000318  2
514 00000318  2    (* Tell someone trace file needs to be updated someday *)
515 00000318  2
516 00000318  2    FOOTDC_INFO.UPDATE_FLAG := TRUE
517 0000031E  2  END; (* Procedure UNLOAD_TM *)
518 00000000  1  $GLOBPROC OFF$
519 00000000  1

508: Warning: field or entry alignment; record or array comparisons may not work

End of compilation, number of errors=    0

  1 00000000  1  "68000" PREPROCESS
  2 00000000  1  $EXTENSIONS ON$
  3 00000000  1  $TITLE "Soda Dynamic Controller:  Trace Mod Utils"
  4 00000000  1  PROGRAM TM_UTLS;
  5 00000000  1  (*
  6 00000000  1  ****************************** TM_UTLS ******************************
  7 00000000  1    TM_UTLS is the module containing utilities used by the trace modules
  8 00000000  1    measurement.  These utilities are accessed by the pre and post
  9 00000000  1    processors for creating/unloading the measurement.
 10 00000000  1    Author:  Kip Fulghum
 11 00000000  1    Date:  8-23-84  Revised:  8-23-84
 12 00000000  1  *********************************************************************
 13 00000000  1
 14 00000000  1    TM_UTLS contains the following routines:
 15 00000000  1    -Global procedure SET_TM_PATHS sets up the needed resource paths for
 16 00000000  1     the given procedure.
 17 00000000  1    -Global procedure FIX_TM_INDENT keeps track of the current and minimum
 18 00000000  1     module indentations for trace modules.
 19 00000000  1
 20 00000000  1    In addition, TM_UTLS uses the following external routines:
 21 00000000  1    ASSIGN_LL_RSRC, ADD_PATH,
 22 00000000  1    GET_VALUE_MASK, GET_BUS_MASK, and P_ADDR.
 23 00000000  1                                                                      *)
 24 00000000  1  (*
 25 00000000  1                          *************************
 26 00000000  1                          ***** Include Files *****
 27 00000000  1                          *************************
 28 00000000  1                                                                      *)
 29 00000000  1
 30 00000000  1  #INCLUDE ER_CONST:SS_DYN
 31 00000000  1
 32 00000000  1  #INCLUDE COM_TYPES:SS_DYN
 33 00000000  1
 34 00000000  1  #INCLUDE LD_TYPES:SS_DYN
 35 00000000  1
 36 00000000  1  #INCLUDE UNLD_TYPES:SS_DYN
 37 00000000  1
 38 00000000  1  #INCLUDE ICMD_DATA:SODAMON
 39 00000000  1
 40 00000000  1
 41 00000000  1
 42 00000000  1
 43 00000000  1
 44 00000000  1  $CALL_ABS_LONG$
 45 00000000  1  (*
 46 00000000  1                          **************************
 47 00000000  1                          ***** ASSIGN_LL_RSRC *****
 48 00000000  1                          **************************
 49 00000000  1                                                                      *)
```

```
00000000 1  FUNCTION ASSIGN_LL_RSRC ( RSRC_TYPE:  LL_TYPE; RSRC_ID:  S_INT;
00000000 2                            LO_VALUE, LO_MASK, HI_VALUE, HI_MASK:
00000000 2                            L_INT; VAR LL_ARRAY:  LL_ARRAY_TYPE ):  S_INT;
00000002 2                            EXTERNAL;
00000000 1  (*
00000000 1   Function ASSIGN_LL_RSRC to allocate a low level resource from those
00000000 1   available for use by the caller.  Provided as a Pascal external.
00000000 1                                                                    *)
00000000 1
00000000 1
00000000 1
00000000 1
00000000 1
00000000 1  (*
00000000 1                          ********************
00000000 1                          ***** ADD_PATH *****
00000000 1                          ********************
00000000 1                                                                    *)
00000000 1  PROCEDURE ADD_PATH ( RSRC_TYPE:  LL_TYPE; PATH_ID:  S_INT; LO_VALUE,
00000000 2                       LO_MASK, HI_VALUE, HI_MASK:  L_INT; VAR
00000000 2                       POS_HL_SET:  HIGH_LEVEL_SET; VAR LO_ARRAY:
00000000 2                       LL_ARRAY_TYPE; VAR HI_ARRAY:  HL_ARRAY_TYPE;
00000000 2                       VAR IO:  I_O_REC; VAR CODE:  S_INT ); EXTERNAL;
00000000 1  (*
00000000 1   Procedure ADD_PATH to create and add a low to high level resource
00000000 1   path to the given function generator I/O node's input function
00000000 1   description.  Provided as a Pascal external.
00000000 1                                                                    *)
00000000 1
00000000 1
00000000 1
00000000 1
00000000 1
00000000 1  (*
00000000 1                       **************************
00000000 1                       ***** GET_VALUE_MASK *****
00000000 1                       **************************
00000000 1                                                                    *)
00000000 1  PROCEDURE GET_VALUE_MASK ( ACCESS:  S_INT; VAR VALUE, MASK:  L_INT );
00000000 2                             EXTERNAL;
00000000 1  (*
00000000 1   Procedure GET_VALUE_MASK to determine the appropriate value and
00000000 1   mask for tracing different processor status, ie reads, writes, etc.
00000000 1   Provided as a Pascal external.
00000000 1                                                                    *)
00000000 1
00000000 1
00000000 1
00000000 1
00000000 1
00000000 1  (*
00000000 1                        ************************
00000000 1                        ***** GET_BUS_MASK *****
00000000 1                        ************************
00000000 1                                                                    *)
00000000 1  FUNCTION GET_BUS_MASK ( BUS:  S_INT ):  L_INT; EXTERNAL;
00000000 1  (*
00000000 1   Function GET_BUS_MASK to return the processor specific mask containing
00000000 1   all 1s for all bits on the given bus.  Provided as a Pascal external.
00000000 1                                                                    *)
00000000 1
00000000 1
00000000 1
00000000 1
00000000 1
00000000 1  (*
00000000 1                          ******************
00000000 1                          ***** P_ADDR *****
00000000 1                          ******************
00000000 1                                                                    *)
00000000 1  PROCEDURE P_ADDR ( LOGICAL_ADDR:  L_INT; VAR PHYSICAL_ADDR:  L_INT );
00000000 2                     EXTERNAL;
```

```
00000000  1  (*
00000000  1    Procedure P_ADDR to return the physical address equivalent of the
00000000  1    given logical address.  Provided as a Pascal external.
00000000  1                                                                       *)
00000000  1
00000000  1
00000000  1
00000000  1
00000000  1
00000000  1  (*
00000000  1                            ****************************
00000000  1                            ***** SET_TM_PATHS *****
00000000  1                            ****************************
00000000  1                                                                       *)
00000000  1  $GLOBPROC UHS
00000000  1  PROCEDURE SET_TM_PATHS ( VAR PROC_REC:  CMD_DATA_TYPE; ID:  S_INT;
00000000  2                           VAR HIGHS:  HIGH_LEVEL_SET; VAR SPEC:
00000000  2                           HW_SPEC_REC; VAR IO:  I_O_REC; VAR NEED_ENTRY:
00000000  2                           BOOLEAN; VAR SET_CODE:  S_INT );
00000000  2  (*
00000000  2    Procedure SET_TM_PATHS to set up the needed resource paths for the
00000000  2    given procedure.  Procedure simply adds all needed paths to the given
00000000  2    I/O node. one at a time.  If any path cannot be created, an error is
00000000  2    returned.
00000000  2
00000000  2    SET TM PATHS uses the following routines:  ASSIGN LL RSRC, ADD PATH,
00000000  2    GET_VALUE_MASK, GET_BUS_MASK, and P_ADDR.
00000000  2
00000000  2    Input:  1) PROC_REC, the record describing the procedure to be
00000000  2               traced
00000000  2            2) ID, the basis for the resource I.D.s to be assigned to
00000000  2               the paths ( if 0, the opcode resource is turned on )
00000000  2            3) HIGHS, the set of possible high level resources to choose
00000000  2               from when creating the paths
00000000  2            4) SPEC, the current hardware specification
00000000  2            5) IO, the input/output record to add the paths to
00000000  2            6) NEED_ENTRY, a flag indicating whether an entry path is
00000000  2               needed ( TRUE ) or not ( FALSE )
00000000  2    Output:  1) SPEC, the modified hardware specification from which the
00000000  2                resources were allocated
00000000  2             2) IO, the modified input/output record
00000000  2             3) NEED_ENTRY, the updated entry flag indicating if we still
00000000  2                need an entry path ( TRUE ) or not ( FALSE )
00000000  2             4) SET_CODE, a return code describing how it went:
00000000  2                 -6 indicates function overflow
00000000  2                 -4 indicates out of high level hardware resources
00000000  2                 -3 indicates out of low level hardware resources
00000000  2                  0 indicates no error:  all assignments completed
00000000  2                                                                       *)
00000000  2  VAR
00000000  2
00000000  2    OP_VALUE:  L_INT; (* Processor value for opcode fetch *)
00000004  2
00000004  2    OP_MASK:  L_INT; (* Processor mask for opcode fetch *)
00000008  2
00000008  2    ADDR_MASK:  L_INT; (* Processor mask for address bus *)
0000000C  2
0000000C  2    RSRC_VALUE:  L_INT; (* Value to load resource with *)
00000010  2
00000010  2    RSRC_MASK:  L_INT; (* Mask to load resource with *)
00000014  2
00000014  2    NEXT_LL: ^S_INT; (* Next assigned low level resource *)
00000004  2
00000004  2  BEGIN (* Procedure SET_TM_PATHS *)
00000004  2    SET_CODE := NO_ERROR; (* It should work *)
0000000A  2
0000000A  2    (* Get processor specific values/masks *)
0000000A  2
0000000A  2    GET_VALUE_MASK ( OPCODE, OP_VALUE, OP_MASK );
00000022  2    ADDR_MASK := GET_BUS_MASK ( 0 );
00000030  2    RSRC_MASK := OP_MASK + ADDR_MASK;
0000003C  2
0000003C  2    (* Turn on opcode resource if necessary *)
0000003C  2
```

```
0000003C  2      IF ID = 0
00000044  2        THEN (* First time through:  turn it on *)
00000044  2          NEXT_LL := ASSIGN_LL_RSRC ( OPCODE_EQUATE, 999, OP_VALUE+
00000044  2                                  ADDR_MASK, OP_MASK, 0, 0,
00000044  2                                  SPEC.LOW_LEVELS );
00000074  2
00000074  2      (* Get resource to watch procedure entry *)
00000074  2
00000074  2      IF NEED_ENTRY = TRUE
00000082  2        THEN (* Need to add an entry path *)
00000082  2          BEGIN (* Add entry path *)
00000082  2            (* Logical --> physical *)
00000082  2            P_ADDR ( PROC_REC.ENTRY, RSRC_VALUE );
00000096  2            RSRC_VALUE := RSRC_VALUE + OP_VALUE;
0000009E  2            ADD_PATH ( ADDRESS_EQUATE, ID*2, RSRC_VALUE, RSRC_MASK,
0000009E  2                       0, 0, HIGHS, SPEC.LOW_LEVELS, SPEC.HIGH_LEVELS,
0000009E  2                       IO, SET_CODE );
000000E4  2            IF SET_CODE = NO_ERROR
000000EE  2              THEN (* Have entry path *)
000000EE  2                NEED_ENTRY := FALSE
000000F4  2          END; (* Add entry path *)
000000F4  2
000000F4  2      (* Get another resource to watch procedure exit *)
000000F4  2
000000F4  2      IF SET_CODE = NO_ERROR
000000FE  2        THEN (* Procedure entry path created *)
000000FE  2          BEGIN (* Add exit path *)
000000FE  2            (* Logical --> physical *)
000000FE  2            P_ADDR ( PROC_REC.EXIT, RSRC_VALUE );
00000112  2            RSRC_VALUE := RSRC_VALUE + OP_VALUE;
0000011A  2            ADD_PATH ( ADDRESS_EQUATE, (ID*2)+1, RSRC_VALUE, RSRC_MASK,
0000011A  2                       0, 0, HIGHS, SPEC.LOW_LEVELS, SPEC.HIGH_LEVELS,
0000011A  2                       IO, SET_CODE )
00000162  2          END (* Add exit path *)
00000162  2    END; (* Procedure SET_TM_PATHS *)
00000000  1    $GLOBPROC OFF$
00000000  1
00000000  1
00000000  1
00000000  1
00000000  1
00000000  1    (*
00000000  1                          *************************
00000000  1                          ***** FIX_TM_INDENT *****
00000000  1                          *************************
00000000  1                                                                        *)
00000000  1    $GLOBPROC ON$
00000000  1    PROCEDURE FIX_TM_INDENT ( THIS_ONE:  S_INT; VAR LAST_ONE, MIN_IN,
00000000  2                              CUR_IN:  S_INT );
0000016A  2    (*
0000016A  2      Procedure FIX_TM_INDENT to keep track of the current and minimum
0000016A  2      module indentations for trace modules.  Procedure determines and
0000016A  2      updates what type of state the current and previous states are
0000016A  2      ( entry/exit ), as well as  updating the current indentation level.
0000016A  2      If the current level ever falls below the minimum, the minimum is
0000016A  2      updated also.
0000016A  2
0000016A  2      Input:  1) THIS_ONE, the data type for current state ( entry/exit )
0000016A  2              2) LAST_ONE, the data type for previous state ( entry/exit )
0000016A  2              3) MIN_IN, the current minimum indentation
0000016A  2              4) CUR_IN, the current indentation for LAST_ONE state
0000016A  2      Output:  1) LAST_ONE, the updated data type for previous state ( which
0000016A  2                  was current state )
0000016A  2               2) MIN_IN, the updated minimum indentation
0000016A  2               3) CUR_IN, the current indentation for THIS_ONE state
0000016A  2                                                                        *)
0000016A  2    BEGIN (* Procedure FIX_TM_INDENT *)
0000016A  2      IF THIS_ONE = LAST_ONE
00000178  2        THEN (* Previous and this state were both entry or exit *)
00000178  2          IF THIS_ONE = PROC_ENTRY
00000180  2            THEN (* Entry to procedure *)
00000180  2              CUR_IN := CUR_IN + 1
0000018E  2            ELSE (* Exit from a procedure *)
0000018E  2              BEGIN (* Update indentation information *)
```

```
0000018E  2             CUR_IN := CUR_IN - 1;
00000198  2             IF CUR_IN < MIN_IN
000001A8  2               THEN (* New minimum indentation *)
000001A8  2                 MIN_IN := CUR_IN
000001AE  2           END; (* Update indentation information *)
000001AE  2     LAST_ONE := THIS_ONE (* Update previous status *)
000001B6  2   END; (* Procedure FIX_TM_INDENT *)
00000000  1   $GLOBPROC OFF$
00000000  1   .

508: Warning: field or entry alignment; record or array comparisons may not work

End of compilation, number of errors=    0

00000000  1   "68000" PREPROCESS
00000000  1   $EXTENSIONS ON$
00000000  1   $LIB_ABS_LONG$
00000000  1   $TITLE "Soda Dynamic Controller:  Trace Statements"
00000000  1   PROGRAM TRACE_STAT;
00000000  1   (*
00000000  1   ****************************** TRACE_STAT ******************************
00000000  1     TRACE_STAT is the module containing the routines for the load pre-
00000000  1     processor and the unload post-processor for the trace statements
00000000  1     measurement.  For pre-processing, the user measurement data structure
00000000  1     is translated to reflect a trace statements measurement.  For post-
00000000  1     processing, the measurement data is unloaded from the hardware,  all
00000000  1     garbage is removed, and the current trace file is updated with all
00000000  1     valid measurement data.
00000000  1     Author:  Kip Fulghum
00000000  1     Date:  4-6-83  Revised:  1-9-85
00000000  1   ************************************************************************
00000000  1
00000000  1     TRACE_STAT contains the following routines:
00000000  1     -Procedure TS_100 handles breaks on memory full or user halt.
00000000  1     -Procedure TS_EXIT handles breaks on exit.
00000000  1     -Procedure TS_OTHERWISE handles breaks on entry or in the middle.
00000000  1     -Global procedure LOAD_TS is the pre-processor for the trace
00000000  1      statements measurement.  It loads the appropriate data structures
00000000  1      with the necessary information to create a trace statements
00000000  1      measurement when loaded into the hardware.
00000000  1     -Global procedure UNLOAD_TS is the post-processor for the trace
00000000  1      statements measurement.  It unloads the hardware one sextuplet at
00000000  1      a time, classifies the data, and creates valid trace file data
00000000  1      records.
00000000  1
00000000  1     In addition, TRACE_STAT uses the following external routines:
00000000  1     START_GEN, ASSIGN_STATE, ASSIGN_IO, ADD_OPERAND, ADD_OPERATOR,
00000000  1     CLOSE_IO_NODE, CLOSE_IO_LIST, SET_FEATURE,
00000000  1     HOW_MUCH_DATA, GET_DATA, CLASSIFY_BREAK, WRITE_FRAME_REC,
00000000  1     WRITE_MSG_REC, UNLOAD_DONE, READRECNUM, PUSH_FRAME, POP_FRAME,
00000000  1     CREATE_FRAME, CLASS_PROC_DATA, P_ADDR, READ_REG,
00000000  1     DEBUG_BREAK,
00000000  1     SET_TS_PATHS, TOGGLE_TS_RSRC, and UNLOAD_TS_MEM.
00000000  1                                                                        *)
00000000  1   (*
00000000  1                            **************************
00000000  1                            ***** Include Files *****
00000000  1                            **************************
00000000  1                                                                        *)
00000000  1
00000000  1   #INCLUDE ER_CONST:SS_DYN
00000000  1
00000000  1   #INCLUDE DEBUG_CONST:SS_DYN
00000000  1
00000000  1   #INCLUDE COM_TYPES:SS_DYN
00000000  1
00000000  1   #INCLUDE LD_TYPES:SS_DYN
00000000  1
00000000  1   #INCLUDE UNLD_TYPES:SS_DYN
00000000  1
00000000  1   #INCLUDE ICMD_DATA:SCDAMON
00000000  1
00000000  1   #INCLUDE FM_TYPES:SS_DYN
```

```
00000000 1
00000000 1 VAR
00000000 1
00000000 1 $GLOBVAR ON$
00000000 1
00000000 1   FRAME_PACKAGE:  FPACK_TYPE; (* Frame package *)
0000040C 1
0000040C 1 $GLOBVAR OFF$
0000040C 1
0000040C 1   PROC_INDEX:  S_INT; (* Index into cmd stack of procedure *)
0000040E 1
0000040E 1   (* The above program level variables must be initialized by the
0000040E 1      pre-processor prior to being used by the post-processor.  This is
0000040E 1      because the post-processor needs several values to remain unchanged
0000040E 1      between calls which occur because of the non-real-time nature of
0000040E 1      this measurement *)
0000040E 1
0000040E 1 $EXTVAR ON$
0000040E 1
0000040E 1   FOOTDC_INFO:  FOOTDC_INFO_TYPE; (* Trace file information *)
0000040E 1
0000040E 1   DEBUG_FLAG:  S_INT; (* Flag for debug options *)
0000040E 1
0000040E 1 $EXTVAR OFF$
0000040E 1
0000040E 1
0000040E 1
0000040E 1
0000040E 1
0000040E 1 $CALL_ABS_LONG$
00000000 1 (*
00000000 1                          *********************
00000000 1                          ***** START_GEN *****
00000000 1                          *********************
00000000 1                                                                   *)
00000000 1 PROCEDURE START_GEN ( VAR GENERATOR:  FUNC_RESOURCE; START_STATE,
00000000 2                       NEXT_STATE:  S_INT; VAR STATE_PTR:  STATE_REC_PTR;
00000000 2                       VAR IO_PTR:  I_O_REC_PTR; VAR HIGH_SET:
00000000 2                       HIGH_LEVEL_SET ); EXTERNAL;
00000000 1 (*
00000000 1   Procedure START_GEN to prepare a function generator for use.
00000000 1   Provided as a Pascal external.
00000000 1                                                                   *)
00000000 1
00000000 1
00000000 1
00000000 1
00000000 1
00000000 1 (*
00000000 1                          ************************
00000000 1                          ***** ASSIGN_STATE *****
00000000 1                          ************************
00000000 1                                                                   *)
00000000 1 FUNCTION ASSIGN_STATE ( CUR_STATE:  STATE_TYPE ):  STATE_REC_PTR;
00000000 2                         EXTERNAL;
00000000 1 (*
00000000 1   Function ASSIGN_STATE to create a new state node for the function
00000000 1   generators data structure.  Provided as a Pascal external.
00000000 1                                                                   *)
00000000 1
00000000 1
00000000 1
00000000 1
00000000 1
00000000 1 (*
00000000 1                          *********************
00000000 1                          ***** ASSIGN_IO *****
00000000 1                          *********************
00000000 1                                                                   *)
00000000 1 FUNCTION ASSIGN_IO ( NEXT_STATE:  STATE_TYPE ):  I_O_REC_PTR;
00000000 2                      EXTERNAL;
00000000 1 (*
00000000 1   Function ASSIGN_IO to create a new I/O node for the function
00000000 1   generators data structure.  Provided as a Pascal external.
00000000 1                                                                   *)
```

```
00000000 1
00000000 1
00000000 1
00000000 1
00000000 1
00000000 1  (*
                                 ***********************
                                 ***** ADD_OPERAND *****
                                 ***********************
00000000 1                                                                  *)
00000000 1  PROCEDURE ADD_OPERAND ( VAR INPUT:  CONDITION_REC; VAR IO:  I_O_REC;
00000000 2                          VAR CODE:  S_INT ); EXTERNAL;
00000000 1  (*
00000000 1    Procedure ADD_OPERAND to "push" an operand onto a function generator
00000000 1    input function description.  Provided as a Pascal external.
00000000 1                                                                  *)
00000000 1
00000000 1
00000000 1
00000000 1
00000000 1
00000000 1  (*
00000000 1                       ************************
00000000 1                       ***** ADD_OPERATOR *****
00000000 1                       ************************
00000000 1                                                                  *)
00000000 1  PROCEDURE ADD_OPERATOR ( INPUT:  ENTRY_TYPE; VAR IO:  I_O_REC;
00000000 2                           VAR CODE:  S_INT ); EXTERNAL;
00000000 1  (*
00000000 1    Procedure ADD_OPERATOR to "push" an operator onto a function generator
00000000 1    input function description.  Provided as a Pascal external.
00000000 1                                                                  *)
00000000 1
00000000 1
00000000 1
00000000 1
00000000 1
00000000 1  (*
00000000 1                      *************************
00000000 1                      ***** CLOSE_IO_NODE *****
00000000 1                      *************************
00000000 1                                                                  *)
00000000 1  PROCEDURE CLOSE_IO_NODE ( FINAL_OUTS:  OUT_SET_TYPE; VAR IO:  I_O_REC;
00000000 2                            VAR CLOSE_CODE:  S_INT ); EXTERNAL;
00000000 1  (*
00000000 1    Procedure CLOSE_IO_NODE to close out a function generator I/O node.
00000000 1    Provided as a Pascal external.
00000000 1                                                                  *)
00000000 1
00000000 1
00000000 1
00000000 1
00000000 1
00000000 1  (*
00000000 1                      *************************
00000000 1                      ***** CLOSE_IO_LIST *****
00000000 1                      *************************
00000000 1                                                                  *)
00000000 1  PROCEDURE CLOSE_IO_LIST ( DC_STATE:  S_INT; DC_OUTS:  OUT_SET_TYPE;
00000000 2                            VAR LAST_IO:  I_O_REC ); EXTERNAL;
00000000 1  (*
00000000 1    Procedure CLOSE_IO_LIST to close out a function generator I/O list
00000000 1    with a don't care I/O node.  Provided as a Pascal external.
00000000 1                                                                  *)
00000000 1
00000000 1
00000000 1
00000000 1
00000000 1
00000000 1  (*
00000000 1                       ***********************
00000000 1                       ***** SET FEATURE *****
00000000 1                       ***********************
00000000 1                                                                  *)
```

```
00000000 1  PROCEDURE SET_FEATURE ( ON_OFF:  CONDITION_TYPE; VAR FEAT_SIG:
00000000 2                           FEATURE_REC ); EXTERNAL;
00000000 1  (*
00000000 1    Procedure SET_FEATURE to turn on/off a feature signal.  Provided as
00000000 1    a Pascal external.
00000000 1                                                                       *)
00000000 1
00000000 1
00000000 1
00000000 1
00000000 1
00000000 1  (*
00000000 1                           **************************
00000000 1                           ***** HOW_MUCH_DATA *****
00000000 1                           **************************
00000000 1                                                                       *)
00000000 1  PROCEDURE HOW_MUCH_DATA ( VAR FLAGS:  FLAG_ARRAY_TYPE; VAR FEAT_ARRAY:
00000000 2                            FEAT_ARRAY_TYPE; START_MAC, END_MAC:  S_INT;
00000000 2                            VAR START_STATE, NUM_STATES:  S_INT );
00000000 2                            EXTERNAL;
00000000 1  (*
00000000 1    Procedure HOW_MUCH_DATA to determine how much data was captured and
00000000 1    starting from where.  Provided as a Pascal external.
00000000 1                                                                       *)
00000000 1
00000000 1
00000000 1
00000000 1
00000000 1
00000000 1  (*
00000000 1                           ********************
00000000 1                           ***** GET_DATA *****
00000000 1                           ********************
00000000 1                                                                       *)
00000000 1  PROCEDURE GET_DATA ( START_STATE, UN_COUNTER:  S_INT; VAR FEAT_ARRAY:
00000000 2                       FEAT_ARRAY_TYPE; VAR BASE:  DOUBLE_ARRAY; VAR
00000000 2                       SEXTET:  SEXTET_REC_TYPE ); EXTERNAL;
00000000 1  (*
00000000 1    Procedure GET_DATA to retrieve a sextet worth of data out of
00000000 1    acquisition memory, translate the emulation data to generic data,
00000000 1    and decode the captured grey-code count.  Provided as a Pascal
00000000 1    external.
00000000 1                                                                       *)
00000000 1
00000000 1
00000000 1
00000000 1
00000000 1
00000000 1  (*
00000000 1                           ***************************
00000000 1                           ***** CLASSIFY_BREAK *****
00000000 1                           ***************************
00000000 1                                                                       *)
00000000 1  FUNCTION CLASSIFY_BREAK ( VAR FLAGS:  FLAG_ARRAY_TYPE; VAR FEAT_ARRAY:
00000000 2                            FEAT_ARRAY_TYPE ):  S_INT; EXTERNAL;
00000000 1  (*
00000000 1    Function CLASSIFY_BREAK to determine what caused the hardware to
00000000 1    break.  Provided as a Pascal external.
00000000 1                                                                       *)
00000000 1
00000000 1
00000000 1
00000000 1
00000000 1
00000000 1  (*
00000000 1                           *****************************
00000000 1                           ***** WRITE_FRAME_REC *****
00000000 1                           *****************************
00000000 1                                                                       *)
00000000 1  PROCEDURE WRITE_FRAME_REC ( D_TYPE:  S_INT; VAR FRAME_INFO:
00000000 2                              FRAME_REC_TYPE; VAR REC_COUNT, FMGR_CODE:
00000000 2                              S_INT ); EXTERNAL;
00000000 1
00000000 1  (*
00000000 1    Procedure WRITE_FRAME_REC to create and write a trace file frame
```

```
00000000 1    record to the disc.  Provided as a Pascal external.
00000000 1                                                                  *)
00000000 1
00000000 1
00000000 1
00000000 1
00000000 1
00000000 1  (*
00000000 1                         *************************
00000000 1                         ***** WRITE_MSG_REC *****
00000000 1                         *************************
00000000 1                                                                  *)
00000000 1  PROCEDURE WRITE_MSG_REC ( D_TYPE, MSG_NO:  S_INT; VAR REC_COUNT,
00000000 2                            FMGR_CODE:  S_INT ); EXTERNAL;
00000000 1  (*
00000000 1    Procedure WRITE_MSG_REC to write a display message record out to the
00000000 1    trace file.  Provided as a Pascal external.
00000000 1                                                                  *)
00000000 1
00000000 1
00000000 1
00000000 1
00000000 1
00000000 1  (*
00000000 1                         ***********************
00000000 1                         ***** UNLOAD_DONE *****
00000000 1                         ***********************
00000000 1                                                                  *)
00000000 1  FUNCTION UNLOAD_DONE ( COUNT:  S_INT ):  BOOLEAN; EXTERNAL;
00000000 1  (*
00000000 1    Function UNLOAD_DONE to determine when the unload sequence is done.
00000000 1    Provided as a Pascal external.
00000000 1                                                                  *)
00000000 1
00000000 1
00000000 1
00000000 1
00000000 1
00000000 1  (*
00000000 1                         **********************
00000000 1                         ***** READRECNUM *****
00000000 1                         **********************
00000000 1                                                                  *)
00000000 1  PROCEDURE READRECNUM ( VAR DCB:  DCB_TYPE; VAR REC_NUM, FMGR_CODE:
00000000 2                         S_INT ); EXTERNAL;
00000000 1  (*
00000000 1    Procedure READRECNUM to determine the current record position.
00000000 1    Provided as a Pascal external.
00000000 1                                                                  *)
00000000 1
00000000 1
00000000 1
00000000 1
00000000 1
00000000 1  (*
00000000 1                         **********************
00000000 1                         ***** PUSH_FRAME *****
00000000 1                         **********************
00000000 1                                                                  *)
00000000 1  PROCEDURE PUSH_FRAME ( ENTRY:  FRAME_PTR_TYPE; VAR STACK:  FSTACK_TYPE;
00000000 2                         VAR TOP:  FSTACK_INDEX; VAR CODE:
00000000 2                         FSTACK_RETCODE ); EXTERNAL;
00000000 1  (*
00000000 1    Procedure PUSH_FRAME to push the given frame onto the given stack.
00000000 1    Provided as a Pascal external.
00000000 1                                                                  *)
00000000 1
00000000 1
00000000 1
00000000 1
00000000 1
00000000 1  (*
00000000 1                         *********************
00000000 1                         ***** POP_FRAME *****
00000000 1                         *********************
```

```
00000000  1                                                                    *)
00000000  1  PROCEDURE POP_FRAME ( VAR STACK:  FSTACK_TYPE; VAR TOP:  FSTACK_INDEX;
00000000  2                        VAR ENTRY:  FRAME_PTR_TYPE; VAR CODE:
00000000  2                        FSTACK_RETCODE ); EXTERNAL;
00000000  1  (*
00000000  1    Procedure POP_FRAME to pop the next frame off the given stack.
00000000  1    Provided as a Pascal external.
00000000  1                                                                    *)
00000000  1
00000000  1
00000000  1
00000000  1
00000000  1
00000000  1  (*
00000000  1                          **************************
00000000  1                          ***** CREATE_FRAME *****
00000000  1                          **************************
00000000  1                                                                    *)
00000000  1  PROCEDURE CREATE_FRAME ( VAR PROC_REC, PARENT_REC:  CMD_DATA_TYPE;
00000000  2                           VAR FRAME_INFO:  FRAME_REC_TYPE; VAR
00000000  2                           CRT_CODE:  S_INT ); EXTERNAL;
00000000  1  (*
00000000  1    Procedure CREATE_FRAME to create a frame record based on the given
00000000  1    procedure and parent information.  Provided as a Pascal external.
00000000  1                                                                    *)
00000000  1
00000000  1
00000000  1
00000000  1
00000000  1
00000000  1  (*
00000000  1                          ****************************
00000000  1                          ***** CLASS_PROC_DATA *****
00000000  1                          ****************************
00000000  1                                                                    *)
00000000  1  FUNCTION CLASS_PROC_DATA ( VAR PROC_REC:  CMD_DATA_TYPE; ADRS, PREV_PC,
00000000  2                             NEXT_PC:  L_INT ):  S_INT; EXTERNAL;
00000000  1  (*
00000000  1    Function CLASS_PROC_DATA to determine what type of procedural data
00000000  1    was captured.  Provided as a Pascal external.
00000000  1                                                                    *)
00000000  1
00000000  1
00000000  1
00000000  1
00000000  1
00000000  1  (*
00000000  1                          *******************
00000000  1                          ***** P_ADDR *****
00000000  1                          *******************
00000000  1                                                                    *)
00000000  1  PROCEDURE P_ADDR ( LOGICAL_ADDR:  L_INT; VAR PHYSICAL_ADDR:  L_INT );
00000000  2                     EXTERNAL;
00000000  1  (*
00000000  1    Procedure P_ADDR to return the physical address equivalent of the
00000000  1    given logical address.  Provided as a Pascal external.
00000000  1                                                                    *)
00000000  1
00000000  1
00000000  1
00000000  1
00000000  1
00000000  1  (*
00000000  1                          *********************
00000000  1                          ***** READ_REG *****
00000000  1                          *********************
00000000  1                                                                    *)
00000000  1  PROCEDURE READ_REG ( REG:  S_INT; VAR REG_VALUE:  L_INT ); EXTERNAL;
00000000  1  (*
00000000  1    Procdedure READ_REG to read the value of the given register ( 0 = PC,
00000000  1    1 = base ptr on entry, 2 = base ptr within ) from the emulator.  Data
00000000  1    is returned MSW, then LSW.  Provided as part of the message handler.
00000000  1                                                                    *)
00000000  1
```

```
00000000  1
00000000  1
00000000  1
00000000  1
00000000  1  (*
00000000  1                          *************************
00000000  1                          ***** DEBUG_BREAK *****
00000000  1                          *************************
00000000  1                                                                   *)
00000000  1  PROCEDURE DEBUG_BREAK ( BCAUSE, BCLASS:  S_INT; PREV_PC, ADRS, NEXT_PC:
00000000  2                          L_INT ); EXTERNAL;
00000000  1  (*
00000000  1    Procedure DEBUG_BREAK to format up all the given information about
00000000  1    a break point, then put it up on the debug line.  Provided as a
00000000  1    Pascal external.
00000000  1                                                                   *)
00000000  1
00000000  1
00000000  1
00000000  1
00000000  1
00000000  1  $CALL_PC_SHORTS
00000000  1  (*
00000000  1                          *************************
00000000  1                          ***** SET_TS_PATHS *****
00000000  1                          *************************
00000000  1                                                                   *)
00000000  1  PROCEDURE SET_TS_PATHS ( VAR PROC_REC:  CMD_DATA_TYPE; ID:  S_INT; VAR
00000000  2                           HIGHS:  HIGH_LEVEL_SET; VAR SPEC:  HW_SPEC_REC;
00000000  2                           VAR LINE_RSRC, OP_RSRC, ENTRY_RSRC, EXIT_RSRC,
00000000  2                           DC_RSRC, SET_CODE:  S_INT ); EXTERNAL;
00000000  1  (*
00000000  1    Procedure SET_TS_PATHS to set up the needed resource paths for the
00000000  1    line range to be traced as well as the procedure entry/exit/dc paths,
00000000  1    if needed.  Provided as a Pascal external.
00000000  1                                                                   *)
00000000  1
00000000  1
00000000  1
00000000  1
00000000  1
00000000  1  (*
00000000  1                          ****************************
00000000  1                          ***** TOGGLE_TS_RSRC *****
00000000  1                          ****************************
00000000  1                                                                   *)
00000000  1  PROCEDURE TOGGLE_TS_RSRC ( TURN_ON:  BOOLEAN; ID:  S_INT; VAR PROC_REC:
00000000  2                             CMD_DATA_TYPE; VAR SPEC:  HW_SPEC_REC );
00000000  2                             EXTERNAL;
00000000  1  (*
00000000  1    Procedure TOGGLE_TS_RSRC to toggle the don't care resource in trace
00000000  1    statements.  Provided as a Pascal external.
00000000  1                                                                   *)
00000000  1
00000000  1
00000000  1
00000000  1
00000000  1
00000000  1  (*
00000000  1                          ***************************
00000000  1                          ***** UNLOAD_TS_MEM *****
00000000  1                          ***************************
00000000  1                                                                   *)
00000000  1  PROCEDURE UNLOAD_TS_MEM ( FFROM, MNUM, FREC_NUM:  S_INT; VAR FEAT_ARRAY:
00000000  2                            FEAT_ARRAY_TYPE; VAR UN_COUNT, FM_CODE:
00000000  2                            S_INT ); EXTERNAL;
00000000  1  (*
00000000  1    Procedure UNLOAD_TS_MEM to unload a portion of acquisition memory
00000000  1    and create appropriate trace file records.  Provided as a Pascal
00000000  1    external.
00000000  1                                                                   *)
00000000  1
00000000  1
00000000  1
```

```
00000000 1
00000000 1
00000000 1  (*
00000000 1                          ******************
00000000 1                          ***** TS_100 *****
00000000 1                          ******************
00000000 1                                                                    *)
00000000 1  PROCEDURE TS_100 ( VAR MEAS:  CMD_DATA_ARRAY; VAR SYMS:
00000000 2                  SYM_DESCRIPS; VAR FLAGS:  FLAG_ARRAY_TYPE; MAC:
00000000 2                  S_INT; VAR SPEC:  HW_SPEC_REC; VAR UN_COUNT,
00000000 2                  TS_CODE:  S_INT );
00000000 2  (*
00000000 2    Procedure TS_100 handles breaks on memory full or user halt for the
00000000 2    trace statements measurement.  It takes care of unloading all
00000000 2    data if valid to do so.
00000000 2
00000000 2    TS_100 uses the following routines:  HOW_MUCH_DATA and UNLOAD_TS_MEM.
00000000 2
00000000 2    Input:  1) MEAS, the structure describing the measurement at a high
00000000 2               level
00000000 2            2) SYMS, a list of all unique symbols involved in the
00000000 2               measurement
00000000 2            3) FLAGS, the flag word data structure containing the
00000000 2               most recently read hardware flags
00000000 2            4) MAC, the memory address counter off the memory board
00000000 2               obtained before unloading began
00000000 2            5) SPEC, the hardware specification which captured the
00000000 2               data
00000000 2            6) UN_COUNT, the previous # of states unloaded and
00000000 2               shipped out to the trace file
00000000 2    Output:  1) SPEC, the possibly modified hardware specification
00000000 2                structure
00000000 2             2) UN_COUNT, the updated # of states unloaded and output
00000000 2                to the trace file
00000000 2             3) TS_CODE, the return code indicating how things turned out:
00000000 2                   0 indicates no error
00000000 2                   3 indicates file not found:  invalid DCB ( should never
00000000 2                     happen )
00000000 2                   5 indicates no free pages available
00000000 2                   7 indicates file corrupt
00000000 2                                                                    *)
00000000 2  VAR
00000000 2
00000000 2    START_LOCATION:  S_INT; (* First location to unload *)
00000002 2
00000002 2    NUM_LOCATIONS:  S_INT; (* Number of locations to unload *)
00000004 2
00000004 2  BEGIN (* Procedure TS_100 *)
00000004 2    TS_CODE := NO_ERROR;
0000000A 2
0000000A 2    (* Unload memory if possible *)
0000000A 2
0000000A 2    IF ( MEAS [ PROC_INDEX ].PROC_NUM = 0 ) OR
0000000A 2       ( FRAME_PACKAGE.CUR_FRAME <> NIL )
00000034 2      THEN (* Program level or proc level and have seen entry *)
00000034 2        BEGIN (* Unload what we got *)
00000034 2          HOW_MUCH_DATA ( FLAGS, SPEC.FEATURES, SPEC.START_MAC, MAC,
00000034 2                          START_LOCATION, NUM_LOCATIONS );
0000005E 2          UNLOAD_TS_MEM ( START_LOCATION, NUM_LOCATIONS, FRAME_PACKAGE.
0000005E 2                          REC_NUM, SPEC.FEATURES, UN_COUNT, TS_CODE )
00000088 2        END (* Unload what we got *)
00000088 2  END; (* Procedure TS_100 *)
00000000 1
00000000 1
00000000 1
00000000 1
00000000 1
00000000 1  (*
00000000 1                          ******************
00000000 1                          ***** TS_EXIT *****
00000000 1                          ******************
00000000 1                                                                    *)
00000000 1  PROCEDURE TS_EXIT ( VAR MEAS:  CMD_DATA_ARRAY; VAR SYMS:
00000000 2                  SYM_DESCRIPS; VAR FLAGS:  FLAG_ARRAY_TYPE; MAC:
```

```
00000000  2                   S_INT; VAR SPEC:  HW_SPEC_REC; VAR UN_COUNT,
00000000  2                   TS_CODE:  S_INT );
00000000  2  (*
00000000  2   Procedure TS_EXIT handles breaks on exit for the trace statements
00000000  2   measurement.  It takes care of unloading data, updating the current
00000000  2   frame on exit, and adjusting the don't care resource appropriately.
00000000  2   Data is unloaded if there is a current frame.  After that, the
00000000  2   procedure tries to restore the previous frame.  If it can, it is
00000000  2   written out.  If it can't, the don't care resource is activated to
00000000  2   try and get a frame.  If there has been an overflow, the overflow
00000000  2   count is decremented.
00000000  2
00000000  2   TS_EXIT uses the following routines:  HOW_MUCH_DATA, WRITE_FRAME_REC,
00000000  2   WRITE_MSG_REC, UNLOAD_DONE, READRECNUM, POP_FRAME, TOGGLE_TS_RSRC, and
00000000  2   UNLOAD_TS_MEM.
00000000  2
00000000  2   Input:  1) MEAS, the structure describing the measurement at a high
00000000  2              level
00000000  2           2) SYMS, a list of all unique symbols involved in the
00000000  2              measurement
00000000  2           3) FLAGS, the flag word data structure containing the
00000000  2              most recently read hardware flags
00000000  2           4) MAC, the memory address counter off the memory board
00000000  2              obtained before unloading began
00000000  2           5) SPEC, the hardware specification which captured the
00000000  2              data
00000000  2           6) UN_COUNT, the previous # of states unloaded and
00000000  2              shipped out to the trace file
00000000  2   Output:  1) SPEC, the possibly modified hardware specification
00000000  2               structure
00000000  2            2) UN_COUNT, the updated # of states unloaded and output
00000000  2               to the trace file
00000000  2            3) TS_CODE, the return code indicating how things turned out:
00000000  2                 0 indicates no error
00000000  2                 3 indicates file not found:  invalid DCB ( should never
00000000  2                   happen )
00000000  2                 5 indicates no free pages available
00000000  2                 7 indicates file corrupt
00000000  2                                                                       *)
00000000  2  VAR
00000000  2
00000000  2   START_LOCATION:  S_INT; (* First location to unload *)
00000002  2
00000002  2   NUM_LOCATIONS:  S_INT; (* Number of locations to unload *)
00000004  2
00000004  2   STACK_CODE:  FSTACK_RETCODE; (* Return code from stack operations *)
00000090  2
00000090  2  BEGIN (* Procedure TS_EXIT *)
00000090  2   TS_CODE := NO_ERROR;
00000096  2
00000096  2       (* Ship what we got *)
00000096  2
00000096  2   IF FRAME_PACKAGE.CUR_FRAME = NIL
0000009E  2     THEN (* Don't have a frame for this data *)
0000009E  2       BEGIN (* Output message *)
0000009E  2         IF UNLOAD_DONE ( UN_COUNT ) = FALSE
000000B4  2           THEN (* Not done *)
000000B4  2             WRITE_MSG_REC ( MSG_DATA, 17, UN_COUNT, TS_CODE )
000000D4  2       END (* Output message *)
000000D8  2     ELSE (* We have a frame to use with this data *)
000000D8  2       BEGIN (* Unload memory *)
000000D8  2         HOW_MUCH_DATA ( FLAGS, SPEC.FEATURES, SPEC.START_MAC, MAC,
000000D8  2                         START_LOCATION, NUM_LOCATIONS );
00000102  2         IF MEAS [ PROC_INDEX ].OP_CODE = LINE_OP
0000011A  2           THEN (* Don't want to unload exit point *)
0000011A  2             NUM_LOCATIONS := NUM_LOCATIONS - 1;
0000011E  2         UNLOAD_TS_MEM ( START_LOCATION, NUM_LOCATIONS, FRAME_PACKAGE.
0000011E  2                         REC_NUM, SPEC.FEATURES, UN_COUNT, TS_CODE );
00000143  2         DISPOSE ( FRAME_PACKAGE.CUR_FRAME );
0000015A  2         FRAME_PACKAGE.CUR_FRAME := NIL
0000015E  2       END; (* Unload memory *)
0000015E  2
0000015E  2    (* Now try to get previous frame *)
```

```
0000015E  2
0000015E  2    IF FRAME_PACKAGE.OFC = 0
00000166  2      THEN (* Can try to get previous frame from stack *)
00000166  2        BEGIN (* Attempt to get previous frame *)
00000166  2          POP_FRAME ( FRAME_PACKAGE.STACK, FRAME_PACKAGE INDEX,
00000166  2                      FRAME_PACKAGE.CUR_FRAME, STACK_CODE );
00000182  2          IF ( STACK_CODE = 1 ) AND ( UNLOAD_DONE ( UN_COUNT ) = FALSE )
00000182  2            AND ( TS_CODE = NO_ERROR )
000001BC  2           THEN (* We found a previous frame *)
000001BC  2             BEGIN (* Return to those golden days of yore *)
000001BC  2               READRECNUM ( FOOTDC_INFO.DCB, FRAME_PACKAGE.REC_NUM,
000001BC  2                            TS_CODE );
000001D6  2               IF TS_CODE = NO_ERROR
000001E0  2                 THEN (* I have the correct record number *)
000001E0  2                   WRITE_FRAME_REC ( FRAME_DATA, FRAME_PACKAGE.
000001E0  2                                     CUR_FRAME^, UN_COUNT, TS_CODE )
00000202  2             END (* Return to those golden days of yore *)
00000206  2           ELSE (* Stack is empty *)
00000206  2             FRAME_PACKAGE.CUR_FRAME := NIL
0000020A  2        END  (* Attempt to get previous frame *)
0000020E  2      ELSE (* Still in overflow situation *)
0000020E  2        FRAME_PACKAGE.OFC := FRAME_PACKAGE.OFC - 1;
00000212  2
00000212  2    (* Fire up don't care resource if we don't have a frame yet,
00000212  2       otherwise turn it off *)
00000212  2
00000212  2    IF FRAME_PACKAGE.CUR_FRAME = NIL
0000021A  2      THEN (* Don't have a current frame *)
0000021A  2        (* Activate don't care to try and get one *)
0000021A  2        TOGGLE_TS_RSRC ( TRUE, 0, MEAS [ PROC_INDEX ], SPEC )
00000244  2      ELSE (* Have a current frame *)
00000244  2        (* Deactivate don't care *)
00000244  2        TOGGLE_TS_RSRC ( FALSE, 0, MEAS [ PROC_INDEX ], SPEC )
00000268  2  END; (* Procedure TS_EXIT *)
00000000  1
00000000  1
00000000  1
00000000  1
00000000  1
00000000  1  (*
00000000  1                          ************************
00000000  1                          ***** TS_OTHERWISE *****
00000000  1                          ************************
00000000  1                                                                        *)
00000000  1  PROCEDURE TS_OTHERWISE ( VAR MEAS:  CMD_DATA_ARRAY; VAR SYMS:
00000000  2                           SYM_DESCRIPS; VAR FLAGS:  FLAG_ARRAY_TYPE;
00000000  2                           MAC:  S_INT; VAR SPEC:  HW_SPEC_REC; VAR
00000000  2                           UN_COUNT, TS_CODE:  S_INT );
00000000  2  (*
00000000  2    Procedure TS_OTHERWISE handles breaks on entry or in the middle for
00000000  2    the trace statements measurement.  It takes care of unloading
00000000  2    recursive data if necessary, creating a new current frame, and
00000000  2    adjusting the don't care resource appropriately.  Data is unloaded
00000000  2    if there is a current frame ( indicating recursion ).  After that,
00000000  2    the procedure tries to save the current frame.  If it cannot, an
00000000  2    overflow count is incremented.  Whether it can or not, it then tries
00000000  2    to make a new one.  If it succeeds, the don't care resource is
00000000  2    deactivated.
00000000  2
00000000  2    TS_OTHERWISE uses the following routines:  HOW_MUCH_DATA,
00000000  2    WRITE_FRAME_REC, UNLOAD_DONE, READRECNUM, PUSH_FRAME, CREATE_FRAME,
00000000  2    TOGGLE_TS_RSRC, and UNLOAD_TS_MEM.
00000000  2
00000000  2    Input:  1) MEAS, the structure describing the measurement at a high
00000000  2               level
00000000  2            2) SYMS, a list of all unique symbols involved in the
00000000  2               measurement
00000000  2            3) FLAGS, the flag word data structure containing the
00000000  2               most recently read hardware flags
00000000  2            4) MAC, the memory address counter off the memory board
00000000  2               obtained before unloading began
00000000  2            5) SPEC, the hardware specification which captured the
00000000  2               data
00000000  2            6) UN_COUNT, the previous # of states unloaded and
```

```
00000000  2              shipped out to the trace file
00000000  2    Output:  1) SPEC, the possibly modified hardware specification
00000000  2                 structure
00000000  2             2) UN_COUNT, the updated # of states unloaded and output
00000000  2                 to the trace file
00000000  2             3) TS_CODE, the return code indicating how things turned out:
00000000  2                 -26 indicates emulation error
00000000  2                 -16 indicates frame cannot be created ( should never
00000000  2                     happen )
00000000  2                   0 indicates no error
00000000  2                   3 indicates file not found.  invalid DCB ( should never
00000000  2                     happen )
00000000  2                   5 indicates no free pages available
00000000  2                   7 indicates file corrupt
00000000  2                                                                      *)
00000000  2  VAR
00000000  2
00000000  2    START_LOCATION:  S_INT; (* First location to unload *)
00000002  2
00000002  2    NUM_LOCATIONS:  S_INT; (* Number of locations to unload *)
00000004  2
00000004  2    STACK_CODE:  FSTACK_RETCODE; (* Return code from stack operations *)
00000270  2
00000270  2  BEGIN (* Procedure TS_OTHERWISE *)
00000270  2    TS_CODE := NO_ERROR;
00000276  2
00000276  2    IF FRAME_PACKAGE.CUR_FRAME <> NIL
0000027E  2      THEN (* Recursive *)
0000027E  2        BEGIN (* Unload recursive data *)
0000027E  2
0000027E  2          (* Ship what we got *)
0000027E  2
0000027E  2          HOW_MUCH_DATA ( FLAGS, SPEC.FEATURES, SPEC.START_MAC, MAC,
0000027E  2                          START_LOCATION, NUM_LOCATIONS );
000002A8  2          UNLOAD_TS_MEM ( START_LOCATION, NUM_LOCATIONS-1, FRAME_PACKAGE.
000002A8  2                          REC_NUM, SPEC.FEATURES, UN_COUNT, TS_CODE );
000002D6  2
000002D6  2          (* Try to save current frame *)
000002D6  2
000002D6  2          PUSH_FRAME ( FRAME_PACKAGE.CUR_FRAME, FRAME_PACKAGE.STACK,
000002D6  2                       FRAME_PACKAGE.INDEX, STACK_CODE );
000002F2  2          IF STACK_CODE = -1
000002FE  2            THEN (* Couldn't save frame *)
000002FE  2              BEGIN (* Increment overflow count *)
000002FE  2                FRAME_PACKAGE.OFC := FRAME_PACKAGE.OFC + 1;
00000302  2                DISPOSE ( FRAME_PACKAGE.CUR_FRAME );
00000314  2                FRAME_PACKAGE.CUR_FRAME := NIL
00000318  2              END (* Increment overflow count *)
00000318  2        END; (* Unload recursive data *)
00000318  2
00000318  2    (* Now, try and create a new frame *)
00000318  2
00000318  2    IF TS_CODE = NO_ERROR
00000322  2      THEN (* We unloaded successfully *)
00000322  2        BEGIN (* Create frame record *)
00000322  2          NEW ( FRAME_PACKAGE.CUR_FRAME );
00000334  2          CREATE_FRAME ( MEAS [ PROC_INDEX ], MEAS [ PROC_INDEX-1 ],
00000334  2                         FRAME_PACKAGE.CUR_FRAME^, TS_CODE )
0000036A  2        END; (* Create frame record *)
0000036A  2    IF ( TS_CODE = NO_ERROR ) AND ( UNLOAD_DONE ( UN_COUNT ) = FALSE )
00000394  2      THEN (* Frame record created successfully *)
00000394  2        BEGIN (* Write out new record *)
00000394  2          READRECNUM ( FOOTDC_INFO.DCB, FRAME_PACKAGE.REC_NUM, TS_CODE );
000003AE  2          IF TS_CODE = NO_ERROR
000003B8  2            THEN (* I have the correct record number *)
000003B8  2              WRITE_FRAME_REC ( FRAME_DATA, FRAME_PACKAGE.CUR_FRAME^,
000003B8  2                                UN_COUNT, TS_CODE )
000003DA  2        END; (* Write out new record *)
000003DA  2
000003DA  2    (* Turn off don't care resource if we have a frame *)
000003DA  2
000003DA  2    IF TS_CODE = CANT_MAKE_FRAME
000003E8  2      THEN (* Want to try again *)
000003E8  2        BEGIN (* Reset *)
000003E8  2          TS_CODE := NO_ERROR;
```

```
000003EE  2          DISPOSE ( FRAME_PACKAGE.CUR_FRAME );
00000400  2          FRAME_PACKAGE.CUR_FRAME := NIL;
00000404  2          TOGGLE_TS_RSRC ( TRUE, 0, MEAS [ PROC_INDEX ], SPEC )
0000042A  2        END (* Reset *)
0000042E  2      ELSE (* Want to deactivate don't care resource *)
0000042E  2        (* Turn it off *)
0000042E  2        TOGGLE_TS_RSRC ( FALSE, 0, MEAS [ PROC_INDEX ], SPEC )
00000452  2  END; (* Procedure TS_OTHERWISE *)
00000000  1
00000000  1
00000000  1
00000000  1
00000000  1
00000000  1  (*
00000000  1                          *******************
00000000  1                          ***** LOAD_TS *****
00000000  1                          *******************
00000000  1                                                                       *)
00000000  1  $GLODPROC ON$
00000000  1  PROCEDURE LOAD_TS ( VAR MEAS_:  CMD_DATA_ARRAY; VAR SYMS_:
00000000  2                      SYM_DESCRIPS; VAR SPEC_:  HW_SPEC_REC; VAR R_CODE:
00000000  2                      S_INT );
00000000  2  (*
00000000  2   Procedure LOAD_TS is the pre-processor for the trace statements
00000000  2   measurement.  It loads the appropriate hardware data structures with
00000000  2   the necessary information to create a trace statements measurement
00000000  2   when loaded into the hardware.  Procedure first assigns hardware
00000000  2   resource paths to the line range, the dedicated opcode fetch, and,
00000000  2   if necessary, to the procedure's entry and exit points.  If that
00000000  2   works, the state machine is created ( appropriate I/O nodes along
00000000  2   with the state nodes ).  Hopefully, when this mess is loaded, it
00000000  2   will work!
00000000  2
00000000  2   LOAD_TS uses the following routines:  START_GEN, ASSIGN_STATE,
00000000  2   ASSIGN_IO, ADD_OPERAND, ADD_OPERATOR, CLOSE_IO_NODE, CLOSE_IO_LIST,
00000000  2   SET_FEATURE, and SET_TS_PATHS.
00000000  2
00000000  2   Input:  1) MEAS_, the input structure to the loader indicating
00000000  2              what the measurement is
00000000  2           2) SYMS_, a list of all unique symbols involved in the
00000000  2              measurement
00000000  2           3) SPEC_, the initialized hardware specification structure
00000000  2   Output:  1) SPEC_, the completed hardware record containing
00000000  2               specifications for usage of the:
00000000  2              a) low level resources,
00000000  2              b) high level resources,
00000000  2              c) fast sequencer,
00000000  2              d) micro-code occurance counters,
00000000  2              e) function generators,
00000000  2              f) misc. signals,
00000000  2              g) occurance counters,
00000000  2              h) extraneous features
00000000  2           2) R_CODE, a code specifying how the load turned out:
00000000  2               -6 indicates translation error:  function description
00000000  2                  overflow
00000000  2               -4 indicates out of high level hardware resources
00000000  2               -3 indicates out of low level hardware resources
00000000  2                0 indicates no error:  load completed
00000000  2                                                                       *)
00000000  2  VAR
00000000  2
00000000  2   STATE:  STATE_REC_PTR; (* Pointer to current state *)
00000004  2
00000004  2   IO:  I_O_REC_PTR; (* Pointer to current I/O condition *)
00000008  2
00000008  2   HL_SET:  HIGH_LEVEL_SET; (* Current set of useable high level
0000000A  2                               resources *)
0000000A  2
0000000A  2   LINE_PATH:  S_INT; (* Assigned high level resource for line path *)
0000000C  2
0000000C  2   O_PATH:  S_INT; (* Assigned high level resource for opcode path *)
0000000E  2
0000000E  2   ENTRY_PATH:  S_INT; (* Assigned high level resource for proc entry *)
00000010  2
00000010  2   EXIT_PATH:  S_INT; (* Assigned high level resource for proc exit *)
```

```
00000012  2
00000012  2     DC_PATH:  S_INT; (* Assigned high level resource for don't care *)
00000450  2
0000045A  2   BEGIN (* Procedure LOAD_TS *)
0000045A  2    R_CODE := NO_ERROR; (* Be optimistic *)
00000460  2
00000460  2    (* Initialize a bunch of stuff for pre AND post-processors *)
00000460  2
00000460  2    WITH FRAME_PACKAGE DO
00000463  2      BEGIN (* Initialize it *)
00000463  2        CUR_FRAME := NIL;
0000046A  2        INDEX := -1;
00000474  2        OFS := 0;
0000047C  2        REC_NUM := 0
00000484  2      END; (* Initialize it *)
00000484  2    PROC_INDEX := SYMS_.SYMBOL_ARRAY [ 0 ].DESCRIP_INDEX; (* 1st symbol *)
00000490  2
00000490  2    (* Start the state machine:  use Y generator *)
00000490  2
00000490  2    (* Start in state 0, goto state 1 when entering line range *)
00000490  2    START_GEN ( SPEC_.FUNC_GENERATORS [ Y ], 0, 1, STATE, IO, HL_SET );
000004BA  2
000004BA  2    (* Create line, opcode, entry, exit, dc resource paths *)
000004BA  2    SET_TS_PATHS ( MEAS_ [ PROC_INDEX ], 0, HL_SET, SPEC_, LINE_PATH,
000004BA  2                   OP_PATH, ENTRY_PATH, EXIT_PATH, DC_PATH, R_CODE );
000004FA  2
000004FA  2    (* Start creating all necessary I/O nodes for state 0 *)
000004FA  2
000004FA  2    IF R_CODE = NO_ERROR
00000504  2      THEN (* All necessary resources exist *)
00000504  2        BEGIN (* Create all I/O nodes for state 0 *)
00000504  2          (* State 0 already created, as is first I/O node watching for
00000504  2             entry to line range:  goes to state 1 when entering range *)
00000504  2          ADD_OPERAND ( SPEC_.HIGH_LEVELS [ LINE_PATH ].HL_OUTPUT,
00000504  2                        IO^, R_CODE );
00000534  2          ADD_OPERAND ( SPEC_.HIGH_LEVELS [ OP_PATH ].HL_OUTPUT,
00000534  2                        IO^, R_CODE );
00000564  2          ADD_OPERATOR ( AND_, IO^, R_CODE );
00000580  2          CLOSE_IO_NODE ( [ STORE, COUNT ], IO^, R_CODE );
0000059C  2          IF ( MEAS_ [ PROC_INDEX ].PROC_NUM <> 0 ) AND
0000059C  2             ( R_CODE = NO_ERROR )
000005C3  2            THEN (* Line range is in a procedure *)
000005C8  2              BEGIN (* Create I/O node for procedure entry/exit *)
000005C8  2                (* Enable emulation break *)
000005C8  2                SET_FEATURE ( ON, SPEC_.FEATURES [ BREAK_ON_STOP ] );
000005DE  2                (* Link this node in prior to previous node! *)
000005DE  2                IO := ASSIGN_IO ( 0 );
000005EC  2                IO^.NEXT_I_O_PTR := STATE^.I_O_PTR;
000005FA  2                STATE^.I_O_PTR := IO;
00000604  2                ADD_OPERAND ( SPEC_.HIGH_LEVELS [ ENTRY_PATH ].HL_OUTPUT,
00000604  2                              IO^, R_CODE );
00000634  2                ADD_OPERAND ( SPEC_.HIGH_LEVELS [ EXIT_PATH ].HL_OUTPUT,
00000634  2                              IO^, R_CODE );
00000664  2                ADD_OPERATOR ( OR_, IO^, R_CODE );
00000680  2                CLOSE_IO_NODE ( [ STORE, COUNT, STOP ], IO^, R_CODE );
0000069C  2                IO := IO^.NEXT_I_O_PTR
000006A6  2              END; (* Create I/O node for procedure entry/exit *)
000006A6  2          (* Create empty input node to continue count *)
000006A6  2          CLOSE_IO_LIST ( 0, [ COUNT ], IO^ ) (* Stay in state 0 *)
000006BA  2        END; (* Create all I/O nodes for state 0 *)
000006BA  2
000006BA  2    (* Start creating all necessary I/O nodes for state 1 *)
000006BA  2
000006BA  2    IF R_CODE = NO_ERROR
000006C4  2      THEN (* State 0 I/O nodes created successfully *)
000006C4  2        BEGIN (* Create all I/O nodes for state 1 *)
000006C4  2          (* Create state 1 *)
000006C4  2          STATE^.NEXT_STATE_PTR := ASSIGN_STATE ( 1 );
000006D6  2          STATE := STATE^.NEXT_STATE_PTR;
000006DA  2          (* Create I/O node watching for exit from line range *)
000006DA  2          IO := ASSIGN_IO ( 0 ); (* Goto state 0 when exiting
000006E8  2                                     range *)
000006E8  2          STATE^.I_O_PTR := IO;
000006F2  2          ADD_OPERAND ( SPEC_.HIGH_LEVELS [ LINE_PATH ].HL_OUTPUT,
000006F2  2                        IO^, R_CODE );
```

```
00000722  2          ADD_OPERATOR ( NOT_, IO^, R_CODE );
0000073E  2          ADD_OPERAND ( SPEC_.HIGH_LEVELS [ CP_PATH ].HL_OUTPUT,
0000073E  2                        IO^, R_CODE );
0000076E  2          ADD_OPERATOR ( AND_, IO^, R_CODE );
0000078A  2          CLOSE_IO_NODE ( [ COUNT ], IO^, R_CODE );
000007A6  2          IF ( MEAS_ [ PROC_INDEX ].PROC_NUM <> 0 ) AND
000007A6  2             ( R_CODE = NO_ERROR )
000007D2  2            THEN (* Line range is in a procedure *)
000007D2  2              BEGIN (* Create I/O node for procedure entry/exit *)
000007D2  2                (* Link this node in prior to previous node! *)
000007D2  2                IO := ASSIGN_IO ( 0 );
000007E0  2                IO^.NEXT_I_O_PTR := STATE^.I_O_PTR;
000007EE  2                STATE^.I_O_PTR := IO;
000007F8  2                ADD_OPERAND ( SPEC_.HIGH_LEVELS [ ENTRY_PATH ].HL_OUTPUT,
000007F8  2                              IO^, R_CODE );
00000828  2                ADD_OPERAND ( SPEC_.HIGH_LEVELS [ EXIT_PATH ].HL_OUTPUT,
00000828  2                              IO^, R_CODE );
00000858  2                (* Stick in don't care break resource:  the "toggle" *)
00000858  2                ADD_OPERAND ( SPEC_.HIGH_LEVELS [ DC_PATH ].HL_OUTPUT,
00000858  2                              IO^, R_CODE );
00000888  2                ADD_OPERATOR ( OR_, IO^, R_CODE );
000008A4  2                ADD_OPERATOR ( OR_, IO^, R_CODE );
000008C0  2                CLOSE_IO_NODE ( [ STORE, COUNT, STOP ], IO^, R_CODE );
000008DC  2                IO := IO^.NEXT_I_O_PTR
000008E6  2              END; (* Create I/O node for procedure entry/exit *)
000008E6  2          (* Create empty input node to continue storing *)
000008E6  2          CLOSE_IO_LIST ( 1, [ STORE, COUNT ], IO^ ) (* Stay in state 1 *)
000008FC  2        END (* Create all I/O nodes for state 1 *)
000008FC  2  END; (* Procedure LOAD_TS *)
00000000  1  $GLOBPROC OFF$
00000000  1
00000000  1
00000000  1
00000000  1
00000000  1
00000000  1  (*
00000000  1                              **********************
00000000  1                              ***** UNLOAD_TS *****
00000000  1                              **********************
00000000  1                                                                      *)
00000000  1  $GLOBPROC ON$
00000000  1  PROCEDURE UNLOAD_TS ( VAR MEAS_:  CMD_DATA_ARRAY; VAR SYMS_:
00000000  2                        SYM_DESCRIPS; VAR FLAGS_:  FLAG_ARRAY_TYPE; MAC_:
00000000  2                        S_INT; VAR SPEC_:  HW_SPEC_REC; VAR UNLD_COUNT,
00000000  2                        R_CODE:  S_INT );
00000000  2  (*
00000000  2    Procedure UNLOAD_TS is the post-processor for the trace statements
00000000  2    measurement.  It unloads the hardware one sextuplet at a time,
00000000  2    classifies the data, and creates valid trace file data records.
00000000  2    Procedure first determines why and where we broke.  If the user
00000000  2    requested a halt or memory is full, the hardware is simply unloaded.
00000000  2    If on entry or in the middle, recursive data is unloaded ( if any ),
00000000  2    and a frame is created.  If on exit, data is unloaded and the
00000000  2    previous frame is restored.  If any error occurs along the way,
00000000  2    the return code is set to reflect the problem.
00000000  2
00000000  2    UNLOAD_TS uses the following routines:  TS_100, TS_EXIT, TS_OTHERWISE,
00000000  2    GET_DATA, CLASSIFY_BREAK, UNLOAD_DONE, CLASS_PROC_DATA, P_ADDR,
00000000  2    READ_REG, and DEBUG_BREAK.
00000000  2
00000000  2    Input:  1) MEAS_, the structure describing the measurement at a high
00000000  2               level
00000000  2            2) SYMS_, a list of all unique symbols involved in the
00000000  2               measurement
00000000  2            3) FLAGS_, the flag word data structure containing the
00000000  2               most recently read hardware flags
00000000  2            4) MAC_, the memory address counter off the memory board
00000000  2               obtained before unloading began
00000000  2            5) SPEC_, the hardware specification which captured the
00000000  2               data
00000000  2            6) UNLD_COUNT, the previous # of states unloaded and
00000000  2               shipped out to the trace file
00000000  2   Output:  1) SPEC_, the possibly modified hardware specification
00000000  2               structure
```

```
00000000  2              2) UNLD_COUNT, the updated # of states unloaded and output
00000000  2                 to the trace file
00000000  2              3) R_CODE, the return code indicating how things turned out:
00000000  2                 -26 indicates emulation error
00000000  2                 -16 indicates frame cannot be created ( should never
00000000  2                       happen )
00000000  2                   0 indicates no error:  the entire measurement was
00000000  2                       completed without an incident serious enough to
00000000  2                       warrant the return of a depressing, irrevokable
00000000  2                       non-zero error code which would indicate that the
00000000  2                       measurement cannot be finished without divine
00000000  2                       intervention
00000000  2                   3 indicates file not found:  invalid DCB ( should never
00000000  2                       happen )
00000000  2                   5 indicates no free pages available
00000000  2                   7 indicates file corrupt
00000000  2                 100 indicates so far so good:  keep doing whatever we
00000000  2                       were doing
00000000  2                                                                       *)
00000000  2  VAR
00000000  2
00000000  2    BREAK_CAUSE:  S_INT; (* Cause of break *)
00000002  2
00000002  2    DATA_TYPE:  S_INT; (* Type of data captured:  entry or exit *)
00000004  2
00000004  2    NEXT_PC:  L_INT; (* Address of next instruction *)
00000008  2
00000008  2    SEXTET_REC:  SEXTET_REC_TYPE; (* Storage for unloaded state *)
0000001E  2
0000001E  2    CURRENT_BASE:  DOUBLE_ARRAY; (* Storage for current base count *)
00000904  2
00000904  2  BEGIN (* Procedure UNLOAD_TS *)
00000904  2    R_CODE := NO_ERROR;
0000090A  2
0000090A  2    (* Find out if we captured anything and why we stopped *)
0000090A  2
0000090A  2    BREAK_CAUSE := CLASSIFY_BREAK ( FLAGS_, SPEC_.FEATURES );
00000924  2    IF ( BREAK_CAUSE > 0 ) AND
00000924  2       ( STORE_BIT IN FLAG_1_SET ( FLAGS_ [ FLAG_1 ] ) ) AND
00000924  2       ( MEAS_ [ PROC_INDEX ].PROC_NUM <> 0 )
00000960  2     THEN (* We broke and stored something and not main program *)
00000960  2       BEGIN (* Find out where we broke *)
00000960  2         GET_DATA ( MAC_-1, 1, SPEC_.FEATURES, CURRENT_BASE,
00000960  2                    SEXTET_REC );
00000988  2         READ_REG ( 0, NEXT_PC );
00000996  2         P_ADDR ( NEXT_PC, NEXT_PC ); (* Logical --> physical *)
000009A6  2         DATA_TYPE := CLASS_PROC_DATA ( MEAS_ [ PROC_INDEX ], SEXTET_REC.
000009A6  2                                  ADRS, SEXTET_REC.PC, NEXT_PC );
000009D2  2         IF ( BREAK_CAUSE = 1 ) AND ( DATA_TYPE <> PROC_ENTRY ) AND
000009D2  2            ( DATA_TYPE <> PROC_EXIT )
00000A00  2           THEN (* Disabled on something other than entry or exit *)
00000A00  2             DATA_TYPE := 100 (* Unload everything *)
00000A06  2       END (* Find out where we broke *)
00000A0A  2     ELSE (* We broke because of user halt, mem full, etc. *)
00000A0A  2       BEGIN (* Unload everything *)
00000A0A  2         SEXTET_REC.PC := 0; (* Clear values for debug *)
00000A0E  2         SEXTET_REC.ADRS := 0;
00000A12  2         NEXT_PC := 0;
00000A16  2         DATA_TYPE := 100 (* Make sure we unload everything *)
00000A1C  2       END; (* Unload everything *)
00000A1C  2
00000A1C  2    IF DEBUG_FLAG = DEBUG_TRACESTA
00000A28  2      THEN (* Debug option is on *)
00000A28  2        DEBUG_BREAK ( BREAK_CAUSE, DATA_TYPE, SEXTET_REC.PC,
00000A28  2                      SEXTET_REC.ADRS, NEXT PC );
00000A48  2
00000A48  2    (* Do something depending on data type *)
00000A48  2
00000A48  2    CASE DATA_TYPE OF
00000A52  2      100:  (* Memory full or user requested halt *)
00000A52  2        TS_100 ( MEAS_, SYMS_, FLAGS_, MAC_, SPEC_, UNLD_COUNT, R_CODE );
00000A88  2      PROC_EXIT:  (* Broke on procedure exit *)
00000A88  2        TS_EXIT ( MEAS_, SYMS_, FLAGS_, MAC_, SPEC_, UNLD_COUNT, R_CODE );
00000A3E  2      GARBAGE:  (* Garbage data *)
```

```
00000AC2  2        ;(* Do nothing *)
00000AC2  2      OTHERWISE (* Broke on procedure entry or in middle *)
00000AC2  2        TS_OTHERWISE ( MEAS_, SYMS_, FLAGS_, MAC_, SPEC_, UNLD_COUNT,
00000AC2  2                       R_CODE )
00000AF4  2    END; (* Of case statement *)
00000B0E  2
00000B0E  2    IF ( R_CODE = NO_ERROR ) AND ( BREAK_CAUSE = 2 ) AND
00000B0E  2       ( UNLOAD_DONE ( UNLD_COUNT ) = FALSE )
00000B48  2      THEN (* Want to keep going because we broke for the measurement and
00000B48  2              haven't unloaded as much as we should *)
00000B48  2        R_CODE := KEEP_GOING
00000B50  2  END; (* Procedure UNLOAD_TS *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $TITLE "Soda Dynamic Controller:  Trace Stat Utils"
00000000  1  PROGRAM TS_UTLS;
00000000  1  (*
00000000  1  ******************************** TS_UTLS ********************************
00000000  1    TS_UTLS is the module containing utilities used by the trace
00000000  1    statements measurement.  These utilities are accessed by the pre and
00000000  1    post processors for creating/unloading the measurement.
00000000  1    Author:  Kip Fulghum
00000000  1    Date:  8-22-84  Revised:  8-22-84
00000000  1  *************************************************************************
00000000  1
00000000  1    TS_UTLS contains the following routines:
00000000  1    -Global procedure SET_TS_PATHS sets up the needed resource paths for
00000000  1     the line range to be traced as well as the procedure entry/exit/dc
00000000  1     paths, if needed.
00000000  1    -Global procedure TOGGLE_TS_RSRC to toggle the don't care resource in
00000000  1     trace statements.
00000000  1    -Global procedure UNLOAD_TS_MEM unloads a portion of acquisition
00000000  1     memory and creates appropriate trace file records.
00000000  1
00000000  1    In addition, TS_UTLS uses the following external routines:
00000000  1    ASSIGN_PATH, CHANGE_LL_RSRC, GET_DATA, WRITE_ANLYS_REC,
00000000  1    UNLOAD_MSG, UNLOAD_DONE,
00000000  1    GET_VALUE_MASK, GET_BUS_MASK, GET_OFFSET, and P_ADDR.
00000000  1                                                                          *)
00000000  1  (*
00000000  1                            ***************************
00000000  1                            ***** Include Files *****
00000000  1                            ***************************
00000000  1                                                                          *)
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1
00000000  1
00000000  1
00000000  1
00000000  1  $CALL_ABS_LONG$
00000000  1  (*
00000000  1                             ************************
00000000  1                             ***** ASSIGN_PATH *****
00000000  1                             ************************
00000000  1                                                                          *)
00000000  1  FUNCTION ASSIGN_PATH ( RSRC_TYPE:  LL_TYPE; PATH_ID:  S_INT; LO_VALUE,
00000000  2                         LO_MASK, HI_VALUE, HI_MASK:  L_INT; VAR
```

```
00000000  2                        POS_HL_SET:  HIGH_LEVEL_SET; VAR LO_ARRAY:
00000000  2                        LL_ARRAY_TYPE; VAR HI_ARRAY:  HL_ARRAY_TYPE ):
00000000  2                        S_INT; EXTERNAL;
00000000  1  (*
00000000  1   Function ASSIGN_PATH to allocate the necessary resources to form a
00000000  1   path from the low level resources to the high level resources.
00000000  1   Provided as a Pascal external.
00000000  1                                                                        *)
00000000  1
00000000  1
00000000  1
00000000  1
00000000  1
00000000  1  (*
00000000  1                        ***************************
00000000  1                        ***** CHANGE_LL_RSRC *****
00000000  1                        ***************************
00000000  1                                                                        *)
00000000  1  PROCEDURE CHANGE_LL_RSRC ( RSRC_ID:  S_INT; LO_VALUE, LO_MASK,
00000000  2                          HI_VALUE, HI_MASK:  L_INT; VAR LL_ARRAY:
00000000  2                          LL_ARRAY_TYPE ); EXTERNAL;
00000000  1  (*
00000000  1   Procedure CHANGE_LL_RSRC to change the values assigned to a low level
00000000  1   resource.  Provided as a Pascal external.
00000000  1                                                                        *)
00000000  1
00000000  1
00000000  1
00000000  1
00000000  1
00000000  1  (*
00000000  1                          ********************
00000000  1                          ***** GET_DATA *****
00000000  1                          ********************
00000000  1                                                                        *)
00000000  1  PROCEDURE GET_DATA ( START_STATE, UN_COUNTER:  S_INT; VAR FEAT_ARRAY:
00000000  2                     FEAT_ARRAY_TYPE; VAR BASE:  DOUBLE_ARRAY; VAR
00000000  2                     SEXTET:  SEXTET_REC_TYPE ); EXTERNAL;
00000000  1  (*
00000000  1   Procedure GET_DATA to retrieve a sextet worth of data out of
00000000  1   acquisition memory, translate the emulation data to generic data,
00000000  1   and decode the captured grey-code count.  Provided as a Pascal
00000000  1   external.
00000000  1                                                                        *)
00000000  1
00000000  1
00000000  1
00000000  1
00000000  1
00000000  1  (*
00000000  1                       *****************************
00000000  1                       ***** WRITE_ANLYS_REC *****
00000000  1                       *****************************
00000000  1                                                                        *)
00000000  1  PROCEDURE WRITE_ANLYS_REC ( D_TYPE, INDEX:  S_INT; N_FIELD:  L_INT; VAR
00000000  2                            SEX_REC:  SEXTET_REC_TYPE; VAR REC_COUNT,
00000000  2                            FNGR_CODE:  S_INT ); EXTERNAL;
00000000  1  (*
00000000  1   Procedure WRITE_ANLYS_REC to create and write a trace file analysis
00000000  1   record to the disc.  Provided as a Pascal external.
00000000  1                                                                        *)
00000000  1
00000000  1
00000000  1
00000000  1
00000000  1
00000000  1  (*
00000000  1                          **********************
00000000  1                          ***** UNLOAD_MSG *****
00000000  1                          **********************
00000000  1                                                                        *)
00000000  1  PROCEDURE UNLOAD_MSG ( STATE:  S_INT ); EXTERNAL;
00000000  1  (*
00000000  1   Procedure UNLOAD_MSG to update the current unload message with the
```

```
00000000  1    given count.  Provided as a Pascal external.
00000000  1                                                                  *)
00000000  1
00000000  1
00000000  1
00000000  1
00000000  1
00000000  1  (*
00000000  1                          *************************
00000000  1                          ***** UNLOAD_DONE *****
00000000  1                          *************************
00000000  1                                                                  *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                                  *)
00000000  1
00000000  1
00000000  1
00000000  1
00000000  1
00000000  1  (*
00000000  1                          ****************************
00000000  1                          ***** GET_VALUE_MASK *****
00000000  1                          ****************************
00000000  1                                                                  *)
00000000  1  PROCEDURE GET_VALUE_MASK ( ACCESS:  S_INT; VAR VALUE, MASK:  L_INT );
00000000  2                                EXTERNAL;
00000000  1  (*
00000000  1    Procedure GET_VALUE_MASK to determine the appropriate value and
00000000  1    mask for tracing different processor status, ie reads, writes, etc.
00000000  1    Provided as a Pascal external.
00000000  1                                                                  *)
00000000  1
00000000  1
00000000  1
00000000  1
00000000  1
00000000  1  (*
00000000  1                          *************************
00000000  1                          ***** GET_BUS_MASK *****
00000000  1                          *************************
00000000  1                                                                  *)
00000000  1  FUNCTION GET_BUS_MASK ( BUS:  S_INT ):  L_INT; EXTERNAL;
00000000  1  (*
00000000  1    Function GET_BUS_MASK to return the processor specific mask containing
00000000  1    all 1s for all bits on the given bus.  Provided as a Pascal external.
00000000  1                                                                  *)
00000000  1
00000000  1
00000000  1
00000000  1
00000000  1
00000000  1  (*
00000000  1                          ***********************
00000000  1                          ***** GET_OFFSET *****
00000000  1                          ***********************
00000000  1                                                                  *)
00000000  1  FUNCTION GET_OFFSET:  L_INT; EXTERNAL;
00000000  1  (*
00000000  1    Function GET_OFFSET to return the appropriate processor pre-fetch
00000000  1    offset.  Provided as a Pascal external.
00000000  1                                                                  *)
00000000  1
00000000  1
00000000  1
00000000  1
00000000  1
00000000  1  (*
00000000  1                          *******************
00000000  1                          ***** P_ADDR *****
00000000  1                          *******************
00000000  1                                                                  *)
```

```
00000000 1  PROCEDURE P_ADDR ( LOGICAL_ADDR:  L_INT; VAR PHYSICAL_ADDR:  L_INT );
00000000 2                  EXTERNAL;
00000000 1  (*
00000000 1   Procedure P_ADDR to return the physical address equivalent of the
00000000 1   given logical address.  Provided as a Pascal external.
00000000 1                                                                   *)
00000000 1
00000000 1
00000000 1
00000000 1
00000000 1
00000000 1
00000000 1  (*
00000000 1                          *************************
00000000 1                          ***** SET_TS_PATHS *****
00000000 1                          *************************
00000000 1                                                                   *)
00000000 1  $GLOBPROC ON$
00000000 1  PROCEDURE SET_TS_PATHS ( VAR PROC_REC:  CMD_DATA_TYPE; ID:  S_INT; VAR
00000000 2                          HIGHS:  HIGH_LEVEL_SET; VAR SPEC:  HW_SPEC_REC;
00000000 2                          VAR LINE_RSRC, OP_RSRC, ENTRY_RSRC, EXIT_RSRC,
00000000 2                          DC_RSRC, SET_CODE:  S_INT );
00000000 2  (*
00000000 2    Procedure SET_TS_PATHS to set up the needed resource paths for the
00000000 2    line range to be traced as well as the procedure entry/exit/dc paths,
00000000 2    if needed.  Procedure simply assigns all needed paths, one at a time.
00000000 2    If any path cannot be created, an error is returned.
00000000 2
00000000 2    SET_TS_PATHS uses the following routines:  ASSIGN_PATH,
00000000 2    GET_VALUE_MASK, GET_BUS_MASK, GET_OFFSET, and P_ADDR.
00000000 2
00000000 2    Input:  1) PROC_REC, the record describing the procedure in which the
00000000 2               line range exists
00000000 2            2) ID, the basis for the resource I.D.s to be assigned to
00000000 2               the paths
00000000 2            3) HIGHS, the set of possible high level resources to choose
00000000 2               from when creating the paths
00000000 2            4) SPEC, the current hardware specification
00000000 2    Output:  1) SPEC, the modified hardware specification from which the
00000000 2                resources were allocated
00000000 2             2) LINE_RSRC, the high level resource assigned to the line
00000000 2                range
00000000 2             3) OP_RSRC, the high level resource assigned to opcode fetch
00000000 2             4) ENTRY_RSRC, the high level resource assigned to the
00000000 2                procedure entry ( only assigned if needed )
00000000 2             5) EXIT_RSRC, the high level resource assigned to the
00000000 2                procedure exit ( only assigned if needed )
00000000 2             6) DC_RSRC, the high level resource assigned to a don't care
00000000 2                ( only assigned if needed )
00000000 2             7) SET_CODE, a return code describing how it went:
00000000 2                 -4 indicates out of high level hardware resources
00000000 2                 -3 indicates out of low level hardware resources
00000000 2                  0 indicates no error:  all assignments completed
00000000 2                                                                   *)
00000000 2  VAR
00000000 2
00000000 2    OP_VALUE:  L_INT; (* Processor value for opcode fetch *)
00000004 2
00000004 2    OP_MASK:  L_INT; (* Processor mask for opcode fetch *)
00000008 2
00000008 2    ADDR_MASK:  L_INT; (* Processor mask for address bus *)
0000000C 2
0000000C 2    STAT_MASK:  L_INT; (* Processor mask for status bus *)
00000010 2
00000010 2    PREFETCH:  L_INT; (* Processor pre-fetch offset *)
00000014 2
00000014 2    RSRC_VALUE1:  L_INT; (* Lower value to load resource with *)
00000018 2
00000018 2    RSRC_VALUE2:  L_INT; (* Upper value to load resource with *)
00000004 2
00000004 2  BEGIN (* Procedure SET_TS_PATHS *)
00000004 2    SET_CODE := NO_ERROR; (* Let's hope for the best *)
0000000A 2
0000000A 2    (* Get processor specific values/masks *)
0000000A 2
0000000A 2    GET_VALUE_MASK ( OPCODE, OP_VALUE, OP_MASK );
```

```
00000022  2   ADDR_MASK := GET_BUS_MASK ( 0 );
00000030  2   STAT_MASK := GET_BUS_MASK ( 2 );
00000040  2   PREFETCH := GET_OFFSET;
0000004A  2
0000004A  2   (* Set up line range addresses *)
0000004A  2
0000004A  2   IF PROC_REC.OP_CODE = PROC_OP
00000058  2     THEN (* This is an entire procedure we are tracing *)
00000058  2       BEGIN (* Set up range to exclude entry epsilon zone *)
00000058  2         RSRC_VALUE1 := PROC_REC.ENTRY + PROC_REC.ENTRY_OFFSET;
0000006A  2         RSRC_VALUE2 := PROC_REC.EXIT
00000070  2       END (* Set up range to exclude entry epsilon zone *)
00000074  2     ELSE (* This is a line range *)
00000074  2       BEGIN (* Set up entire range *)
00000074  2         RSRC_VALUE1 := PROC_REC.ADDRESS;
0000007E  2         RSRC_VALUE2 := PROC_REC.ADDRESS + PROC_REC.SIZE - 1
0000008C  2       END; (* Set up entire range *)
0000008C  2   RSRC_VALUE1 := RSRC_VALUE1 + PREFETCH; (* Add in pre-fetch offset *)
00000094  2
00000094  2   (* Create line and opcode resource paths for the msrmnt *)
00000094  2
00000094  2   (* Don't care status on the line range *)
00000094  2   P_ADDR ( RSRC_VALUE1, RSRC_VALUE1 ); (* Logical --> physical *)
000000A4  2   RSRC_VALUE1 := RSRC_VALUE1 + STAT_MASK;
000000AC  2   P_ADDR ( RSRC_VALUE2, RSRC_VALUE2 ); (* Logical --> physical *)
000000BC  2   RSRC_VALUE2 := RSRC_VALUE2 + STAT_MASK;
000000C4  2   LINE_RSRC := ASSIGN_PATH ( ADDRESS_RANGE, ID, RSRC_VALUE1, ADDR_MASK,
000000C4  2                              RSRC_VALUE2, ADDR_MASK, HIGHS,
000000C4  2                              SPEC.LOW_LEVELS, SPEC.HIGH_LEVELS );
00000102  2   IF LINE_RSRC < 0
0000010C  2     THEN (* Problems *)
0000010C  2       SET_CODE := LINE_RSRC;
00000116  2
00000116  2   RSRC_VALUE1 := OP_VALUE + ADDR_MASK;
00000122  2   OP_RSRC := ASSIGN_PATH ( OPCODE_EQUATE, ID+1, RSRC_VALUE1, OP_MASK,
00000122  2                            0, 0, HIGHS, SPEC.LOW_LEVELS, SPEC.
00000122  2                            HIGH_LEVELS );
0000015E  2   IF OP_RSRC < 0
00000168  2     THEN (* Problems *)
00000168  2       SET_CODE := OP_RSRC;
00000172  2
00000172  2   (* Create procedure entry/exit/dc paths if necessary *)
00000172  2
00000172  2   IF PROC_REC.PROC_NUM <> 0
0000017E  2     THEN (* We are tracing a procedure *)
0000017E  2       BEGIN (* Set up entry/exit paths *)
0000017E  2         RSRC_VALUE1 := PROC_REC.ENTRY + PREFETCH; (* Add pre-fetch *)
0000018A  2         P_ADDR ( RSRC_VALUE1, RSRC_VALUE1 ); (* Logical --> physical *)
00000198  2         RSRC_VALUE1 := RSRC_VALUE1 + OP_VALUE;
000001A0  2         ENTRY_RSRC := ASSIGN_PATH ( ADDRESS_EQUATE, ID+2, RSRC_VALUE1,
000001A0  2                                     ADDR_MASK+OP_MASK, 0, 0, HIGHS,
000001A0  2                                     SPEC.LOW_LEVELS, SPEC.HIGH_LEVELS );
000001E4  2         IF ENTRY_RSRC < 0
000001EE  2           THEN (* Problems *)
000001EE  2             SET_CODE := ENTRY_RSRC;
000001F8  2
000001F8  2         RSRC_VALUE2 := PROC_REC.EXIT;
00000202  2         P_ADDR ( RSRC_VALUE2, RSRC_VALUE2 ); (* Logical --> physical *)
00000212  2         RSRC_VALUE2 := RSRC_VALUE2 + OP_VALUE;
0000021A  2         EXIT_RSRC := ASSIGN_PATH ( ADDRESS_EQUATE, ID+3, RSRC_VALUE2,
0000021A  2                                    ADDR_MASK+OP_MASK, 0, 0, HIGHS,
0000021A  2                                    SPEC.LOW_LEVELS, SPEC.HIGH_LEVELS );
0000025E  2         IF EXIT_RSRC < 0
00000268  2           THEN (* Problems *)
00000268  2             SET_CODE := EXIT_RSRC;
00000272  2
00000272  2         (* Ask for data equate:  no reason to waste an address resource
00000272  2            for a don't care! *)
00000272  2         DC_RSRC := ASSIGN_PATH ( DATA_EQUATE, ID+4, -1, 0, 0, 0, HIGHS,
00000272  2                                  SPEC.LOW_LEVELS, SPEC.HIGH_LEVELS );
000002AE  2         IF DC_RSRC < 0
000002B8  2           THEN (* Problems *)
000002B8  2             SET_CODE := DC_RSRC
000002C2  2       END (* Set up entry/exit paths *)
```

```
000002C2  2  END; (* Procedure SET_TS_PATHS *)
00000000  1  $GLOBPROC OFF$
00000000  1
00000000  1
00000000  1
00000000  1
00000000  1
00000000  1  (*
00000000  1                        ****************************
00000000  1                        ***** TOGGLE_TS_RSRC *****
00000000  1                        ****************************
00000000  1                                                                   *)
00000000  1  $GLOBPROC ON$
00000000  1  PROCEDURE TOGGLE_TS_RSRC ( TURN_ON:  BOOLEAN; ID:  S_INT; VAR PROC_REC:
00000000  2                           CMD_DATA_TYPE; VAR SPEC:  HW_SPEC_REC );
00000000  2  (*
00000000  2    Procedure TOGGLE_TS_RSRC to toggle the don't care resource in trace
00000000  2    statements.  Depending upon TURN_ON, the resource is either enabled
00000000  2    or disabled.
00000000  2
00000000  2    TOGGLE_TS_RSRC uses the following routine:  CHANGE_LL_RSRC.
00000000  2
00000000  2    Input:  1) TURN_ON, a flag indicating if the resource is to be
00000000  2               enabled ( TRUE ) or disabled ( FALSE )
00000000  2            2) ID, the basis for the resource I.D.s assigned to the
00000000  2               original paths
00000000  2            3) PROC_REC, the record describing the procedure being traced
00000000  2            4) SPEC, the hardware specification
00000000  2    Output:  1) SPEC, the updated hardware specification
00000000  2                                                                   *)
00000000  2  VAR
00000000  2
00000000  2    RSRC_VALUE:  L_INT; (* Value to load resource with *)
000002CA  2
000002CA  2  BEGIN (* Procedure TOGGLE_TS_RSRC *)
000002CA  2    IF TURN_ON = TRUE
000002D6  2      THEN (* Want to enable resource *)
000002D6  2        RSRC_VALUE := -1
000002E2  2      ELSE (* Want to disable resource *)
000002E2  2        RSRC_VALUE := 0;
000002E6  2
000002E6  2    (* Toggle the resource *)
000002E6  2    CHANGE_LL_RSRC ( ID+4, RSRC_VALUE, 0, 0, 0, SPEC.LOW_LEVELS );
0000030A  2    SPEC.RSRC_DIRTY := TRUE
00000314  2  END; (* Procedure TOGGLE_TS_RSRC *)
00000000  1  $GLOBPROC OFF$
00000000  1
00000000  1
00000000  1
00000000  1
00000000  1
00000000  1  (*
00000000  1                        ****************************
00000000  1                        ***** UNLOAD_TS_MEM *****
00000000  1                        ****************************
00000000  1                                                                   *)
00000000  1  $GLOBPROC ON$
00000000  1  PROCEDURE UNLOAD_TS_MEM ( FFROM, NNUM, FREC_NUM:  S_INT; VAR FEAT_ARRAY:
00000000  2                           FEAT_ARRAY_TYPE; VAR UN_COUNT, FM_CODE:
00000000  2                           S_INT );
00000000  2  (*
00000000  2    Procedure UNLOAD_TS_MEM to unload a portion of acquisition memory
00000000  2    and create appropriate trace file records.  Procedure simply loops
00000000  2    from the given start for the given number of states, extracting data
00000000  2    from the hardware and writing it out to disc.
00000000  2
00000000  2    Note:  the first state unloaded will have a 0 time/state count
00000000  2           associated with it!
00000000  2
00000000  2    UNLOAD_TS_MEM uses the following routines:  GET_DATA, WRITE_ANLYS_REC,
00000000  2    UNLOAD_MSG, and UNLOAD_DONE.
00000000  2
00000000  2    Input:  1) FFROM, the starting memory state to unload
00000000  2            2) NNUM, the number of states to unload
00000000  2            3) FREC_NUM, the record number of the last frame record
00000000  2               output
```

```
00000000  2           4) FEAT_ARRAY, the feature array containing the current status
00000000  2              of the FP counter, ie whether it is counting time or states
00000000  2           5) UN_COUNT, the number of records unloaded so far
00000000  2   Output:  1) UN_COUNT, the updated number of records unloaded so far
00000000  2           2) FM_CODE, the return code:
00000000  2                0 indicates no error:  data records completed
00000000  2                3 indicates file not found:  invalid DCB ( should never
00000000  2                  happen )
00000000  2                5 indicates no free pages available
00000000  2                7 indicates file corrupt
00000000  2                                                                   *)
00000000  2  VAR
00000000  2
00000000  2    I:  S_INT; (* WHILE loop memory counter *)
00000002  2
00000002  2    SEXTET_REC:  SEXTET_REC_TYPE; (* Storage for unloaded state *)
00000018  2
00000018  2    CUR_BASE:  DOUBLE_ARRAY; (* Storage for current base count *)
0000031C  2
0000031C  2  BEGIN (* Procedure UNLOAD_TS_MEM *)
0000031C  2    FM_CODE := NO_ERROR; (* Assume the impossible *)
00000322  2    I := 1; (* Start at the start *)
00000328  2
00000328  2    (* Unload it all *)
00000328  2
00000328  2    WHILE ( FM_CODE = NO_ERROR ) AND ( I <= NNUM ) AND
00000328  2          ( UNLOAD_DONE ( UN_COUNT ) = FALSE ) DO
00000362  2      BEGIN (* Unload trace statements data *)
00000362  2        IF NNUM > 1024
0000036E  2          THEN (* Too long a wait:  output unload msg *)
0000036E  2            UNLOAD_MSG ( I );
00000378  2
00000378  2        (* Pull a sextet out of the hardware *)
00000378  2
00000378  2        GET_DATA ( FFROM, I, FEAT_ARRAY, CUR_BASE, SEXTET_REC );
0000039A  2
0000039A  2        (* Ship it *)
0000039A  2
0000039A  2        WRITE_ANLYS_REC ( STATEMENTS, 0, FREC_NUM, SEXTET_REC, UN_COUNT,
0000039A  2                          FM_CODE );
000003C4  2        I := I + 1 (* Increment memory count *)
000003C8  2      END (* Unload trace statements data *)
000003CC  2  END; (* Procedure UNLOAD_TS_MEM *)
00000000  1  $GLOBPROC OFF$
00000000  1  .
```

508: Warning: field or entry alignment; record or array comparisons may not work End of compilation, number of errors=    0

```
00000000  1  "68000" PREPROCESS
00000000  1  $EXTENSIONS ON$
00000000  1  $LIB_ABS_LONG$
00000000  1  $TITLE "Soda Dynamic Controller:  RT Trace Statements"
00000000  1  PROGRAM TRACE_RSTAT;
00000000  1  (*
00000000  1  ****************************** TRACE_RSTAT ******************************
00000000  1    TRACE_RSTAT is the module containing the routines for the load pre-
00000000  1    processor and the unload post-processor for the real-time trace
00000000  1    statements measurement.  For pre-processing, the user measurement data
00000000  1    structure is translated to reflect a real-time trace statements
00000000  1    measurement.  For post-processing, the measurement data is unloaded
00000000  1    from the hardware,  all garbage is removed, and the current trace
00000000  1    file is updated with all valid measurement data.
00000000  1    Author:  Kip Fulghum
00000000  1    Date:  9-15-84  Revised:  1-9-85
00000000  1  *************************************************************************
00000000  1
00000000  1    TRACE_RSTAT contains the following routines:
00000000  1    -Global procedure LOAD_TSR is the pre-processor for the real-time
00000000  1     trace statements measurement.  It loads the appropriate data
00000000  1     structures with the necessary information to create a real-time
00000000  1     trace statements measurement when loaded into the hardware.
00000000  1    -Global procedure UNLOAD_TSR is the post-processor for the real-time
00000000  1     trace statements measurement.  It unloads the hardware one sextuplet
```

```
00000000 1     at a time, classifies the data, and creates valid trace file data
00000000 1     records.
00000000 1
00000000 1    In addition, TRACE_RSTAT uses the following external routines:
00000000 1    START_GEN, ASSIGN_STATE, ASSIGN_IO, ADD_OPERAND, ADD_OPERATOR,
00000000 1    CLOSE_IO_NODE, CLOSE_IO_LIST,
00000000 1    HOW_MUCH_DATA,
00000000 1    SET_TSR_PATHS, and UNLOAD_TS_MEM.
00000000 1                                                                  *)
00000000 1  (*
00000000 1                           ***************************
00000000 1                           ***** Include Files *****
00000000 1                           ***************************
00000000 1                                                                  *)
00000000 1
00000000 1  #INCLUDE ER_CONST:SS_DYN
00000000 1
00000000 1  #INCLUDE COM_TYPES:SS_DYN
00000000 1
00000000 1  #INCLUDE LD_TYPES:SS_DYN
00000000 1
00000000 1  #INCLUDE UNLD_TYPES:SS_DYN
00000000 1
00000000 1  #INCLUDE ICMD_DATA:SODAMON
00000000 1
00000000 1
00000000 1
00000000 1
00000000 1
00000000 1  $CALL_ABS_LONGS
00000000 1  (*
00000000 1                            **********************
00000000 1                            ***** START_GEN *****
00000000 1                            **********************
00000000 1                                                                  *)
00000000 1  PROCEDURE START_GEN ( VAR GENERATOR:  FUNC_RESOURCE; START_STATE,
00000000 2                        NEXT_STATE:  S_INT; VAR STATE_PTR:  STATE_REC_PTR;
00000000 2                        VAR IO_PTR:  I_O_REC_PTR; VAR HIGH_SET:
00000000 2                        HIGH_LEVEL_SET ); EXTERNAL;
00000000 1  (*
00000000 1    Procedure START_GEN to prepare a function generator for use.
00000000 1    Provided as a Pascal external.
00000000 1                                                                  *)
00000000 1
00000000 1
00000000 1
00000000 1
00000000 1
00000000 1  (*
00000000 1                           ***************************
00000000 1                           ***** ASSIGN_STATE *****
00000000 1                           ***************************
00000000 1                                                                  *)
00000000 1  FUNCTION ASSIGN_STATE ( CUR_STATE:  STATE_TYPE ):  STATE_REC_PTR;
00000000 2                          EXTERNAL;
00000000 1  (*
00000000 1    Function ASSIGN_STATE to create a new state node for the function
00000000 1    generators data structure.  Provided as a Pascal external.
00000000 1                                                                  *)
00000000 1
00000000 1
00000000 1
00000000 1
00000000 1
00000000 1  (*
00000000 1                            **********************
00000000 1                            ***** ASSIGN_IO *****
00000000 1                            **********************
00000000 1                                                                  *)
00000000 1  FUNCTION ASSIGN_IO ( NEXT_STATE:  STATE_TYPE ):  I_O_REC_PTR;
00000000 2                       EXTERNAL;
00000000 1  (*
00000000 1    Function ASSIGN_IO to create a new I/O node for the function
00000000 1    generators data structure.  Provided as a Pascal external.
00000000 1                                                                  *)
```

```
00000000  1
00000000  1
00000000  1
00000000  1
00000000  1
00000000  1  (*
00000000  1                          ************************
00000000  1                          ***** ADD_OPERAND *****
00000000  1                          ************************
00000000  1                                                                            *)
00000000  1  PROCEDURE ADD_OPERAND ( VAR INPUT:  CONDITION_REC; VAR IO:  I_O_REC;
00000000  2                          VAR CODE:  S_INT ); EXTERNAL;
00000000  1  (*
00000000  1    Procedure ADD_OPERAND to "push" an operand onto a function generator
00000000  1    input function description.  Provided as a Pascal external.
00000000  1                                                                            *)
00000000  1
00000000  1
00000000  1
00000000  1
00000000  1
00000000  1  (*
00000000  1                          *************************
00000000  1                          ***** ADD_OPERATOR *****
00000000  1                          *************************
00000000  1                                                                            *)
00000000  1  PROCEDURE ADD_OPERATOR ( INPUT:  ENTRY_TYPE; VAR IO:  I_O_REC;
00000000  2                           VAR CODE:  S_INT ); EXTERNAL;
00000000  1  (*
00000000  1    Procedure ADD_OPERATOR to "push" an operator onto a function generator
00000000  1    input function description.  Provided as a Pascal external.
00000000  1                                                                            *)
00000000  1
00000000  1
00000000  1
00000000  1
00000000  1
00000000  1  (*
00000000  1                          **************************
00000000  1                          ***** CLOSE_IO_NODE *****
00000000  1                          **************************
00000000  1                                                                            *)
00000000  1  PROCEDURE CLOSE_IO_NODE ( FINAL_OUTS:  OUT_SET_TYPE; VAR IO:  I_O_REC;
00000000  2                            VAR CLOSE_CODE:  S_INT ); EXTERNAL;
00000000  1  (*
00000000  1    Procedure CLOSE_IO_NODE to close out a function generator I/O node.
00000000  1    Provided as a Pascal external.
00000000  1                                                                            *)
00000000  1
00000000  1
00000000  1
00000000  1
00000000  1
00000000  1  (*
00000000  1                          **************************
00000000  1                          ***** CLOSE_IO_LIST *****
00000000  1                          **************************
00000000  1                                                                            *)
00000000  1  PROCEDURE CLOSE_IO_LIST ( DC_STATE:  S_INT; DC_OUTS:  OUT_SET_TYPE;
00000000  2                            VAR LAST_IO:  I_O_REC ); EXTERNAL;
00000000  1  (*
00000000  1    Procedure CLOSE_IO_LIST to close out a function generator I/O list
00000000  1    with a don't care I/O node.  Provided as a Pascal external.
00000000  1                                                                            *)
00000000  1
00000000  1
00000000  1
00000000  1
00000000  1
00000000  1  (*
00000000  1                          **************************
00000000  1                          ***** HOW_MUCH_DATA *****
00000000  1                          **************************
00000000  1                                                                            *)
```

```
00000000 1  PROCEDURE HOW_MUCH_DATA ( VAR FLAGS:  FLAG_ARRAY_TYPE; VAR FEAT_ARRAY:
00000000 2                           FEAT_ARRAY_TYPE; START_MAC, END_MAC:  S_INT;
00000000 2                           VAR START_STATE, NUM_STATES:  S_INT );
00000000 2                           EXTERNAL;
00000000 1  (*
00000000 1    Procedure HOW_MUCH_DATA to determine how much data was captured and
00000000 1    starting from where.  Provided as a Pascal external.
00000000 1                                                                        *)
00000000 1
00000000 1
00000000 1
00000000 1
00000000 1
00000000 1  $CALL_PC_SHORTS
00000000 1  (*
00000000 1                        ***************************
00000000 1                        ***** SET_TSR_PATHS *****
00000000 1                        ***************************
00000000 1                                                                        *)
00000000 1  PROCEDURE SET_TSR_PATHS ( VAR PROC_REC:  CMD_DATA_TYPE; ID:  S_INT; VAR
00000000 2                           HIGHS:  HIGH_LEVEL_SET; VAR SPEC:
00000000 2                           HW_SPEC_REC; VAR LINE_RSRC, OP_RSRC, SET_CODE:
00000000 2                           S_INT ); EXTERNAL;
00000000 1  (*
00000000 1    Procedure SET_TSR_PATHS to set up the needed resource paths for the
00000000 1    line range to be traced.  Provided as a Pascal external.
00000000 1                                                                        *)
00000000 1
00000000 1
00000000 1
00000000 1
00000000 1
00000000 1  (*
00000000 1                        ***************************
00000000 1                        ***** UNLOAD_TS_MEM *****
00000000 1                        ***************************
00000000 1                                                                        *)
00000000 1  PROCEDURE UNLOAD_TS_MEM ( FFROM, MNUM, FREC_NUM:  S_INT; VAR FEAT_ARRAY:
00000000 2                           FEAT_ARRAY_TYPE; VAR UN_COUNT, FM_CODE:
00000000 2                           S_INT ); EXTERNAL;
00000000 1  (*
00000000 1    Procedure UNLOAD_TS_MEM to unload a portion of acquisition memory
00000000 1    and create appropriate trace file records.  Provided as a Pascal
00000000 1    external.
00000000 1                                                                        *)
00000000 1
00000000 1
00000000 1
00000000 1
00000000 1
00000000 1  (*
00000000 1                        **********************
00000000 1                        ***** LOAD_TSR *****
00000000 1                        **********************
00000000 1                                                                        *)
00000000 1  $GLOBPROC ON$
00000000 1  PROCEDURE LOAD_TSR ( VAR MEAS_:  CMD_DATA_ARRAY; VAR SYMS_:
00000000 2                      SYM_DESCRIPS; VAR SPEC_:  HW_SPEC_REC; VAR R_CODE:
00000000 2                      S_INT );
00000000 2  (*
00000000 2    Procedure LOAD_TSR is the pre-processor for the real-time trace
00000000 2    statements measurement.  It loads the appropriate hardware data
00000000 2    structures with the necessary information to create a trace statements
00000000 2    measurement when loaded into the hardware.  Procedure first assigns
00000000 2    hardware resource paths to the line range and the dedicated opcode
00000000 2    fetch.  If that works, the state machine is created ( appropriate
00000000 2    I/O nodes along with the state nodes ).
00000000 2
00000000 2    LOAD_TSR uses the following routines:  START_GEN, ASSIGN_STATE,
00000000 2    ASSIGN_IO, ADD_OPERAND, ADD_OPERATOR, CLOSE_IO_MODE, CLOSE_IO_LIST,
00000000 2    and SET_TSR_PATHS.
00000000 2
00000000 2    Input:  1) MEAS_, the input structure to the loader indicating
00000000 2               what the measurement is
00000000 2            2) SYMS_, a list of all unique symbols involved in the
00000000 2               measurement
```

```
00000000  2           3) SPEC_, the initialized hardware specification structure
00000000  2   Output:  1) SPEC_, the completed hardware record containing
00000000  2              specifications for usage of the:
00000000  2             a) low level resources,
00000000  2             b) high level resources,
00000000  2             c) fast sequencer,
00000000  2             d) micro-code occurance counters,
00000000  2             e) function generators,
00000000  2             f) misc. signals,
00000000  2             g) occurance counters,
00000000  2             h) extraneous features
00000000  2           2) R_CODE, a code specifying how the load turned out:
00000000  2              -6 indicates translation error:  function description
00000000  2                 overflow
00000000  2              -4 indicates out of high level hardware resources
00000000  2              -3 indicates out of low level hardware resources
00000000  2               0 indicates no error:  load completed
00000000  2                                                                      *)
00000000  2 VAR
00000000  2
00000000  2   STATE:  STATE_REC_PTR; (* Pointer to current state *)
00000004  2
00000004  2   IO:  I_O_REC_PTR; (* Pointer to current I/O condition *)
00000008  2
00000008  2   HL_SET:  HIGH_LEVEL_SET; (* Current set of useable high level
0000000A  2                               resources *)
0000000A  2
0000000A  2   LINE_PATH:  S_INT; (* Assigned high level resource for line path *)
0000000C  2
0000000C  2   OP_PATH:  S_INT; (* Assigned high level resource for opcode path *)
0000000E  2
0000000E  2   PROC_INDEX:  S_INT; (* Index into cmd stack of procedure *)
00000004  2
00000004  2 BEGIN (* Procedure LOAD_TSR *)
00000004  2   R_CODE := NO_ERROR; (* Be optimistic *)
0000000A  2
0000000A  2   PROC_INDEX := SYMS_.SYMBOL_ARRAY [ 0 ].DESCRIP_INDEX; (* 1st symbol *)
00000016  2
00000016  2   (* Start the state machine:  use Y generator *)
00000016  2
00000016  2   (* Start in state 0, goto state 1 when entering line range *)
00000016  2   START_GEN ( SPEC_.FUNC_GENERATORS [ Y ], 0, 1, STATE, IO, HL_SET );
00000040  2
00000040  2   (* Create line and opcode resource paths *)
00000040  2   SET_TSR_PATHS ( MEAS_ [ PROC_INDEX ], 0, HL_SET, SPEC_, LINE_PATH,
00000040  2                   OP_PATH, R_CODE );
00000074  2
00000074  2   (* Start creating all necessary I/O nodes for state 0 *)
00000074  2
00000074  2   IF R_CODE = NO_ERROR
0000007E  2     THEN (* All necessary resources exist *)
0000007E  2       BEGIN (* Create all I/O nodes for state 0 *)
0000007E  2         (* State 0 already created, as is first I/O node watching for
0000007E  2            entry to line range:  goes to state 1 when entering range *)
0000007E  2         ADD_OPERAND ( SPEC_.HIGH_LEVELS [ LINE_PATH ].HL_OUTPUT,
0000007E  2                       IO^, R_CODE );
000000AE  2         ADD_OPERAND ( SPEC_.HIGH_LEVELS [ OP_PATH ].HL_OUTPUT,
000000AE  2                       IO^, R_CODE );
000000DE  2         ADD_OPERATOR ( AND_, IO^, R_CODE );
000000FA  2         CLOSE_IO_NODE ( [ STORE, COUNT ], IO^, R_CODE );
00000116  2         (* Create empty input node to continue count *)
00000116  2         CLOSE_IO_LIST ( 0, [ COUNT ], IO^ ) (* Stay in state 0 *)
0000012A  2       END; (* Create all I/O nodes for state 0 *)
0000012A  2
0000012A  2   (* Start creating all necessary I/O nodes for state 1 *)
0000012A  2
0000012A  2   IF R_CODE = NO_ERROR
00000134  2     THEN (* State 0 I/O nodes created successfully *)
00000134  2       BEGIN (* Create all I/O nodes for state 1 *)
00000134  2         (* Create state 1 *)
00000134  2         STATE^.NEXT_STATE_PTR := ASSIGN_STATE ( 1 );
00000146  2         STATE := STATE^.NEXT_STATE_PTR;
0000014A  2         (* Create I/O node watching for exit from line range *)
0000014A  2         IO := ASSIGN_IO ( 0 ); (* Goto state 0 when exiting
00000158  2                                  range *)
```

```
00000153  2          STATE^.I_O_PTR := IO;
00000162  2          ADD_OPERAND ( SPEC_.HIGH_LEVELS [ LINE_PATH ].HL_OUTPUT,
00000162  2                       IO^, R_CODE );
00000192  2          ADD_OPERATOR ( NOT_, IO^, R_CODE );
000001AE  2          ADD_OPERAND ( SPEC_.HIGH_LEVELS [ OP_PATH ].HL_OUTPUT,
000001AE  2                       IO^, R_CODE );
000001DE  2          ADD_OPERATOR ( AND_, IO^, R_CODE );
000001FA  2          CLOSE_IO_NODE ( [ COUNT ], IO^, R_CODE );
00000216  2          (* Create empty input node to continue storing *)
00000216  2          CLOSE_IO_LIST ( 1, [ STORE, COUNT ], IO^ ) (* Stay in state 1 *)
0000022C  2        END (* Create all I/O nodes for state 1 *)
0000022C  2  END; (* Procedure LOAD_TSR *)
00000000  1  $GLOBPROC OFF$
00000000  1
00000000  1
00000000  1
00000000  1
00000000  1
00000000  1  (*
00000000  1                            ***********************
00000000  1                            ***** UNLOAD_TSR *****
00000000  1                            ***********************
00000000  1                                                                     *)
00000000  1  $GLOBPROC ON$
00000000  1  PROCEDURE UNLOAD_TSR ( VAR MEAS_:  CMD_DATA_ARRAY; VAR SYMS_:
00000000  2                         SYM_DESCRIPS; VAR FLAGS_:  FLAG_ARRAY_TYPE; MAC_:
00000000  2                         S_INT; VAR SPEC_:  HW_SPEC_REC; VAR UNLD_COUNT,
00000000  2                         R_CODE:  S_INT );
00000000  2  (*
00000000  2   Procedure UNLOAD_TSR is the post-processor for the real-time trace
00000000  2   statements measurement.  It unloads the hardware one sextuplet at a
00000000  2   time, classifies the data, and creates valid trace file data records.
00000000  2   If any error occurs along the way, the return code is set to reflect
00000000  2   the problem.
00000000  2
00000000  2   UNLOAD_TSR uses the following routines:  HOW_MUCH_DATA and
00000000  2   UNLOAD_TS_MEM.
00000000  2
00000000  2   Input:  1) MEAS_, the structure describing the measurement at a high
00000000  2              level
00000000  2           2) SYMS_, a list of all unique symbols involved in the
00000000  2              measurement
00000000  2           3) FLAGS_, the flag word data structure containing the
00000000  2              most recently read hardware flags
00000000  2           4) MAC_, the memory address counter off the memory board
00000000  2              obtained before unloading began
00000000  2           5) SPEC_, the hardware specification which captured the
00000000  2              data
00000000  2           6) UNLD_COUNT, the previous # of states unloaded and
00000000  2              shipped out to the trace file
00000000  2   Output:  1) SPEC_, the possibly modified hardware specification
00000000  2               structure
00000000  2            2) UNLD_COUNT, the updated # of states unloaded and output
00000000  2               to the trace file
00000000  2            3) R_CODE, the return code indicating how things turned out:
00000000  2                  0 indicates no error:  data records completed
00000000  2                  3 indicates file not found:  invalid DCB ( should never
00000000  2                    happen )
00000000  2                  5 indicates no free pages available
00000000  2                  7 indicates file corrupt
00000000  2                                                                     *)
00000000  2  VAR
00000000  2
00000000  2    START_LOCATION:  S_INT; (* First location to unload *)
00000002  2
00000002  2    NUM_LOCATIONS:  S_INT; (* Number of locations to unload *)
00000234  2
00000234  2  BEGIN (* Procedure UNLOAD_TSR *)
00000234  2    R_CODE := NO_ERROR;
0000023A  2
0000023A  2    (* Figure out how much to unload *)
0000023A  2
0000023A  2    HOW_MUCH_DATA ( FLAGS_, SPEC_.FEATURES, SPEC_.START_MAC, MAC_,
0000023A  2                    START_LOCATION, NUM_LOCATIONS );
```

```
00000264  2
00000264  2     (* Now, unload it all *)
00000264  2
00000264  2     UNLOAD_TS_MEM ( START_LOCATION, NUM_LOCATIONS, 0, SPEC_.FEATURES,
00000264  2                     UNLD_COUNT, R_CODE )
0000028C  2  END; (* Procedure UNLOAD_TSR *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $TITLE "Soda Dynamic Controller:  RT Trace Stat Utils"
00000000  1  PROGRAM TSR_UTLS;
00000000  1  (*
00000000  1  ******************************** TSR_UTLS ********************************
00000000  1    TSR_UTLS is the module containing utilities used by the real-time
00000000  1    trace statements measurement.  These utilities are accessed by the pre
00000000  1    and post processors for creating/unloading the measurement.
00000000  1    Author:  Kip Fulghum
00000000  1    Date:  9-15-84  Revised:  9-15-84
00000000  1  **************************************************************************
00000000  1
00000000  1    TSR_UTLS contains the following routines:
00000000  1    -Global procedure SET_TSR_PATHS sets up the needed resource paths for
00000000  1     the line range to be traced.
00000000  1
00000000  1    In addition, TSR_UTLS uses the following external routines:
00000000  1    ASSIGN_PATH,
00000000  1    GET_VALUE_MASK, GET_BUS_MASK, GET_OFFSET, and P_ADDR.
00000000  1                                                                         *)
00000000  1  (*
00000000  1                          ***************************
00000000  1                          ***** Include Files *****
00000000  1                          ***************************
00000000  1                                                                         *)
00000000  1
00000000  1  #INCLUDE ER_CONST:SS_DYN
00000000  1
00000000  1  #INCLUDE COM TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1
00000000  1
00000000  1
00000000  1
00000000  1  $CALL_ABS_LONG$
00000000  1  (*
00000000  1                          *************************
00000000  1                          ***** ASSIGN_PATH *****
00000000  1                          *************************
00000000  1                                                                         *)
00000000  1  FUNCTION ASSIGN_PATH ( RSRC_TYPE:  LL_TYPE; PATH_ID:  S_INT; LO_VALUE,
00000000  2                         LO_MASK, HI_VALUE, HI_MASK:  L_INT; VAR
00000000  2                         POS_HL_SET:  HIGH_LEVEL_SET; VAR LO_ARRAY:
00000000  2                         LL_ARRAY_TYPE; VAR HI_ARRAY:  HL_ARRAY_TYPE ):
00000000  2                         S_INT; EXTERNAL;
00000000  1  (*
00000000  1    Function ASSIGN_PATH to allocate the necessary resources to form a
00000000  1    path from the low level resources to the high level resources.
00000000  1    Provided as a Pascal external.
00000000  1                                                                         *)
00000000  1
00000000  1
```

```
00000000  1
00000000  1
00000000  1
00000000  1  (*
00000000  1                        ****************************
00000000  1                        ***** GET_VALUE_MASK *****
00000000  1                        ****************************
00000000  1                                                                   *)
00000000  1  PROCEDURE GET_VALUE_MASK ( ACCESS:  S_INT; VAR VALUE, MASK:  L_INT );
00000000  2                              EXTERNAL;
00000000  1  (*
00000000  1    Procedure GET_VALUE_MASK to determine the appropriate value and
00000000  1    mask for tracing different processor status, ie reads, writes, etc.
00000000  1    Provided as a Pascal external.
00000000  1                                                                   *)
00000000  1
00000000  1
00000000  1
00000000  1
00000000  1
00000000  1  (*
00000000  1                         **************************
00000000  1                         ***** GET_BUS_MASK *****
00000000  1                         **************************
00000000  1                                                                   *)
00000000  1  FUNCTION GET_BUS_MASK ( BUS:  S_INT ):  L_INT; EXTERNAL;
00000000  1  (*
00000000  1    Function GET_BUS_MASK to return the processor specific mask containing
00000000  1    all 1s for all bits on the given bus.  Provided as a Pascal external.
00000000  1                                                                   *)
00000000  1
00000000  1
00000000  1
00000000  1
00000000  1
00000000  1  (*
00000000  1                          ************************
00000000  1                          ***** GET_OFFSET *****
00000000  1                          ************************
00000000  1                                                                   *)
00000000  1  FUNCTION GET_OFFSET:  L_INT; EXTERNAL;
00000000  1  (*
00000000  1    Function GET_OFFSET to return the appropriate processor pre-fetch
00000000  1    offset.  Provided as a Pascal external.
00000000  1                                                                   *)
00000000  1
00000000  1
00000000  1
00000000  1
00000000  1
00000000  1  (*
00000000  1                            ********************
00000000  1                            ***** P_ADDR *****
00000000  1                            ********************
00000000  1                                                                   *)
00000000  1  PROCEDURE P_ADDR ( LOGICAL_ADDR:  L_INT; VAR PHYSICAL_ADDR:  L_INT );
00000000  2                     EXTERNAL;
00000000  1  (*
00000000  1    Procedure P_ADDR to return the physical address equivalent of the
00000000  1    given logical address.  Provided as a Pascal external.
00000000  1                                                                   *)
00000000  1
00000000  1
00000000  1
00000000  1
00000000  1
00000000  1  (*
00000000  1                        ****************************
00000000  1                        ***** SET_TSR_PATHS *****
00000000  1                        ****************************
00000000  1                                                                   *)
00000000  1  $GLOBPROC ON$
00000000  1  PROCEDURE SET_TSR_PATHS ( VAR PROC_REC:  CMD_DATA_TYPE; ID:  S_INT; VAR
00000000  2                              HIGHS:  HIGH_LEVEL_SET; VAR SPEC:
```

```
00000000  2                          HW_SPEC_REC; VAR LINE_RSRC, OP_RSRC, SET_CODE:
00000000  2                          S_INT );
00000000  2  (*
00000000  2   Procedure SET_TSR_PATHS to set up the needed resource paths for the
00000000  2   line range to be traced.  Procedure simply assigns all needed paths,
00000000  2   one at a time.  If any path cannot be created, an error is returned.
00000000  2
00000000  2   SET_TSR_PATHS uses the following routines:  ASSIGN_PATH,
00000000  2   GET_VALUE_MASK, GET_BUS_MASK, GET_OFFSET, and P_ADDR.
00000000  2
00000000  2   Input:  1) PROC_REC, the record describing the procedure in which the
00000000  2              line range exists
00000000  2           2) ID, the basis for the resource I.D.s to be assigned to
00000000  2              the paths
00000000  2           3) HIGHS, the set of possible high level resources to choose
00000000  2              from when creating the paths
00000000  2           4) SPEC, the current hardware specification
00000000  2   Output:  1) SPEC, the modified hardware specification from which the
00000000  2               resources were allocated
00000000  2            2) LINE_RSRC, the high level resource assigned to the line
00000000  2               range
00000000  2            3) OP_RSRC, the high level resource assigned to opcode fetch
00000000  2            4) SET_CODE, a return code describing how it went:
00000000  2                -4 indicates out of high level hardware resources
00000000  2                -3 indicates out of low level hardware resources
00000000  2                 0 indicates no error:  all assignments completed
00000000  2                                                                      *)
00000000  2  VAR
00000000  2
00000000  2   OP_VALUE:  L_INT; (* Processor value for opcode fetch *)
00000004  2
00000004  2   OP_MASK:  L_INT; (* Processor mask for opcode fetch *)
00000008  2
00000008  2   ADDR_MASK:  L_INT; (* Processor mask for address bus *)
0000000C  2
0000000C  2   STAT_MASK:  L_INT; (* Processor mask for status bus *)
00000010  2
00000010  2   PREFETCH:  L_INT; (* Processor pre-fetch offset *)
00000014  2
00000014  2   RSRC_VALUE1:  L_INT; (* Lower value to load resource with *)
00000018  2
00000018  2   RSRC_VALUE2:  L_INT; (* Upper value to load resource with *)
00000004  2
00000004  2  BEGIN (* Procedure SET_TSR_PATHS *)
00000004  2   SET_CODE := NO_ERROR; (* Let's hope for the best *)
0000000A  2
0000000A  2   (* Set processor specific values/masks *)
0000000A  2
0000000A  2   GET_VALUE_MASK ( OPCODE, OP_VALUE, OP_MASK );
00000022  2   ADDR_MASK := GET_BUS_MASK ( 0 );
00000030  2   STAT_MASK := GET_BUS_MASK ( 2 );
00000040  2   PREFETCH := GET_OFFSET;
0000004A  2
0000004A  2   (* Set up line range addresses *)
0000004A  2
0000004A  2   IF PROC_REC.OP_CODE = PROC_OP
00000058  2     THEN (* This is an entire procedure we are tracing *)
00000058  2       BEGIN (* Set up range to exclude entry epsilon zone *)
00000058  2         RSRC_VALUE1 := PROC_REC.ENTRY + PROC_REC.ENTRY_OFFSET;
0000006A  2         RSRC_VALUE2 := PROC_REC.EXIT
00000070  2       END (* Set up range to exclude entry epsilon zone *)
00000074  2     ELSE (* This is a line range *)
00000074  2       BEGIN (* Set up entire range *)
00000074  2         RSRC_VALUE1 := PROC_REC.ADDRESS;
0000007E  2         RSRC_VALUE2 := PROC_REC.ADDRESS + PROC_REC.SIZE - 1
0000008C  2       END; (* Set up entire range *)
0000008C  2   RSRC_VALUE1 := RSRC_VALUE1 + PREFETCH; (* Add in pre-fetch offset *)
00000094  2
00000094  2   (* Create line and opcode resource paths for the msrmnt *)
00000094  2
00000094  2   (* Don't care status on the line range *)
00000094  2   P_ADDR ( RSRC_VALUE1, RSRC_VALUE1 ); (* Logical --> physical *)
000000A4  2   RSRC_VALUE1 := RSRC_VALUE1 + STAT_MASK;
000000AC  2   P_ADDR ( RSRC_VALUE2, RSRC_VALUE2 ); (* Logical --> physical *)
```

```
0000008C  2    RSRC_VALUE2 := RSRC_VALUE2 + STAT_MASK;
000000C4  2    LINE_RSRC := ASSIGN_PATH ( ADDRESS_RANGE, ID, RSRC_VALUE1, ADDR_MASK,
000000C4  2                               RSRC_VALUE2, ADDR_MASK, HIGHS,
000000C4  2                               SPEC.LOW_LEVELS, SPEC.HIGH_LEVELS );
00000102  2    IF LINE_RSRC < 0
0000010C  2      THEN (* Problems *)
0000010C  2        SET_CODE := LINE_RSRC;
00000116  2
00000116  2    RSRC_VALUE1 := OP_VALUE + ADDR_MASK;
00000122  2    OP_RSRC := ASSIGN_PATH ( OPCODE_EQUATE, ID+1, RSRC_VALUE1, OP_MASK,
00000122  2                             0, 0, HIGHS, SPEC.LOW_LEVELS, SPEC.
00000122  2                             HIGH_LEVELS );
0000015E  2    IF OP_RSRC < 0
00000168  2      THEN (* Problems *)
00000168  2        SET_CODE := OP_RSRC
00000172  2  END; (* Procedure SET_TSR_PATHS *)
00000000  1  $GLOBPROC OFF$
00000000  1  .

508: Warning: field or entry alignment; record or array comparisons may not work

End of compilation, number of errors=     0

00000000  1  "68000" PREPROCESS
00000000  1  $EXTENSIONS ON$
00000000  1  $LIB_ABS_LONG$
00000000  1  $TITLE "Soda Dynamic Controller:  Trace Data Flow"
00000000  1  PROGRAM TRACE_DATA;
00000000  1  (*
00000000  1  ****************************** TRACE_DATA ******************************
00000000  1    TRACE_DATA is the module containing the routines for the load pre-
00000000  1    processor and the unload post-processor for the trace data flow
00000000  1    measurement.  For pre-processing, the user measurement data structure
00000000  1    is translated to reflect a trace data flow measurement.  For post-
00000000  1    processing, the measurement data is unloaded from the hardware,  all
00000000  1    garbage is removed, and the current trace file is updated with all
00000000  1    valid measurement data.
00000000  1    Author:  Kip Fulghum
00000000  1    Date:  6-6-83  Revised:  1-10-85
00000000  1  **************************************************************************
00000000  1
00000000  1    TRACE_DATA contains the following routines:
00000000  1    -Procedure TD_PEXIT handles breaks on pseudo exit.
00000000  1    -Procedure TD_PENTRY handles breaks on pseudo entry.
00000000  1    -Procedure TD_OTHERWISE handles breaks on entry or in the middle.
00000000  1    -Global procedure LOAD_TD is the pre-processor for the trace
00000000  1     data flow measurement.  It loads the appropriate data structures
00000000  1     with the necessary information to create a trace data flow
00000000  1     measurement when loaded into the hardware.
00000000  1    -Global procedure UNLOAD_TD is the post-processor for the trace
00000000  1     data flow measurement.  It unloads the hardware and emulation
00000000  1     memory, classifies the data, and creates valid trace file data
00000000  1     records.
00000000  1
00000000  1    In addition, TRACE_DATA uses the following external routines:
00000000  1    START_GEN, CLOSE_OR_NODE, SET_FEATURE,
00000000  1    GET_DATA, CLASSIFY_BREAK, FIND_STATIC, WRITE_ANLYS_REC, WRITE_MSG_REC,
00000000  1    UNLOAD_DONE, PUSH_FRAME, POP_FRAME,
00000000  1    CREATE_FRAME, CLASS_PROC_DATA, P_ADDR, READ_REG, GET_CALL_ADRS,
00000000  1    DEBUG_BREAK,
00000000  1    SET_TD_PATHS, RESET_TD_RSRC, TOGGLE_TD_RSRC, and GET_TD_VARS.
00000000  1                                                                         *)
00000000  1
00000000  1  (*
00000000  1                           *************************
00000000  1                           ***** Include Files *****
00000000  1                           *************************
00000000  1                                                                         *)
00000000  1
00000000  1  #INCLUDE ER_CONST:SS_DYN
00000000  1
00000000  1  #INCLUDE DEBUG_CONST:SS_DYN
00000000  1
00000000  1  #INCLUDE COM_TYPES:SS_DYN
00000000  1
00000000  1  #INCLUDE LD_TYPES:SS_DYN
```

```
00000000  1
00000000  1  #INCLUDE UNLD_TYPES:SS_DYN
00000000  1
00000000  1  #INCLUDE ICMD_DATA:SODAMON
00000000  1
00000000  1  VAR
00000000  1
00000000  1  $EXTVAR ONS (* Use the frame pack stuff from TRACE_STATEMENTS *)
00000000  1
00000000  1    FRAME_PACKAGE:  FPACK_TYPE; (* Frame package *)
00000000  1
00000000  1    (* The above program level variables must be initialized by the
00000000  1       pre-processor prior to being used by the post-processor.  This is
00000000  1       because the post-processor needs several values to remain unchanged
00000000  1       between calls which occur because of the non-real-time nature of
00000000  1       this measurement *)
00000000  1
00000000  1    DEBUG_FLAG:  S_INT; (* Flag for debug options *)
00000000  1
00000000  1  $EXTVAR OFF$
00000000  1
00000000  1    SYMBOL_INDEX:  S_INT; (* Index into symbol table to symbol info
00000002  1                           for hardware sextet *)
00000002  1
00000002  1    PROC_INDEX:  S_INT; (* Index into cmd stack of proc record *)
00000004  1
00000004  1    DATA_TYPE:  S_INT; (* Type of data captured:  entry or exit *)
00000006  1
00000006  1    SEXTET_REC:  SEXTET_REC_TYPE; (* Storage for unloaded state *)
0000001C  1
0000001C  1
0000001C  1
0000001C  1
0000001C  1
0000001C  1  $CALL_ABS_LONGS
00000000  1  (*
00000000  1                           ***********************
00000000  1                           ****** START_GEN ******
00000000  1                           ***********************
00000000  1                                                                     *)
00000000  1  PROCEDURE START_GEN ( VAR GENERATOR:  FUNC_RESOURCE; START_STATE,
00000000  2                        NEXT_STATE:  S_INT; VAR STATE_PTR:  STATE_REC_PTR;
00000000  2                        VAR IO_PTR:  I_O_REC_PTR; VAR HIGH_SET:
00000000  2                        HIGH_LEVEL_SET ); EXTERNAL;
00000000  1  (*
00000000  1    Procedure START_GEN to prepare a function generator for use.
00000000  1    Provided as a Pascal external.
00000000  1                                                                     *)
00000000  1
00000000  1
00000000  1
00000000  1
00000000  1
00000000  1  (*
00000000  1                         **************************
00000000  1                         ****** CLOSE_OR_NODE ******
00000000  1                         **************************
00000000  1                                                                     *)
00000000  1  PROCEDURE CLOSE_OR_NODE ( FINAL_OUTS:  OUT_SET_TYPE; VAR IO:  I_O_REC;
00000000  2                            VAR CLOSE_CODE:  S_INT ); EXTERNAL;
00000000  1  (*
00000000  1    Procedure CLOSE_OR_NODE to close out a function generator I/O node
00000000  1    consisting of a number of ORed terms.  Provided as a Pascal external.
00000000  1                                                                     *)
00000000  1
00000000  1
00000000  1
00000000  1
00000000  1
00000000  1  (*
00000000  1                          ************************
00000000  1                          ****** SET_FEATURE ******
00000000  1                          ************************
00000000  1                                                                     *)
00000000  1  PROCEDURE SET_FEATURE ( ON_OFF:  CONDITION_TYPE; VAR FEAT_SIG:
```

```
00000000  2                         FEATURE_REC ); EXTERNAL;
00000000  1  (*
00000000  1    Procedure SET_FEATURE to turn on/off a feature signal.  Provided as
00000000  1    a Pascal external.
00000000  1                                                                          *)
00000000  1
00000000  1
00000000  1
00000000  1
00000000  1
00000000  1  (*
00000000  1                            ********************
00000000  1                            ***** GET_DATA *****
00000000  1                            ********************
00000000  1                                                                          *)
00000000  1  PROCEDURE GET_DATA ( START_STATE, UN_COUNTER:  S_INT; VAR FEAT_ARRAY:
00000000  2                      FEAT_ARRAY_TYPE; VAR BASE:  DOUBLE_ARRAY; VAR
00000000  2                      SEXTET:  SEXTET_REC_TYPE ); EXTERNAL;
00000000  1  (*
00000000  1    Procedure GET_DATA to retrieve a sextet worth of data out of
00000000  1    acquisition memory, translate the emulation data to generic data,
00000000  1    and decode the captured grey-code count.  Provided as a Pascal
00000000  1    external.
00000000  1                                                                          *)
00000000  1
00000000  1
00000000  1
00000000  1
00000000  1
00000000  1  (*
00000000  1                         **************************
00000000  1                         ***** CLASSIFY_BREAK *****
00000000  1                         **************************
00000000  1                                                                          *)
00000000  1  FUNCTION CLASSIFY_BREAK ( VAR FLAGS:  FLAG_ARRAY_TYPE; VAR FEAT_ARRAY:
00000000  2                            FEAT_ARRAY_TYPE ):  S_INT; EXTERNAL;
00000000  1  (*
00000000  1    Function CLASSIFY_BREAK to determine what caused the hardware to
00000000  1    break.  Provided as a Pascal external.
00000000  1                                                                          *)
00000000  1
00000000  1
00000000  1
00000000  1
00000000  1
00000000  1  (*
00000000  1                          ***********************
00000000  1                          ***** FIND_STATIC *****
00000000  1                          ***********************
00000000  1
00000000  1  FUNCTION FIND_STATIC ( VAR MEAS_STRUCT:  CMD_DATA_ARRAY; VAR
00000000  2                         SYM_STRUCT:  SYM_DESCRIPS; EMUL_ADRS:  L_INT ):
00000000  2                         S_INT; EXTERNAL;
00000000  1  (*
00000000  1    Function FIND_STATIC returns the index of the record in the
00000000  1    symbol table structure related to the given static data.  Provided
00000000  1    as a Pascal external.
00000000  1                                                                          *)
00000000  1
00000000  1
00000000  1
00000000  1
00000000  1
00000000  1  (*
00000000  1                        ***************************
00000000  1                        ***** WRITE_ANLYS_REC *****
00000000  1                        ***************************
00000000  1                                                                          *)
00000000  1  PROCEDURE WRITE_ANLYS_REC ( D_TYPE, INDEX:  S_INT; N_FIELD:  L_INT; VAR
00000000  2                              SEX_REC:  SEXTET_REC_TYPE; VAR REC_COUNT,
00000000  2                              FMGR_CODE:  S_INT ); EXTERNAL;
00000000  1  (*
00000000  1    Procedure WRITE_ANLYS_REC to create and write a trace file analysis
00000000  1    record to the disc.  Provided as a Pascal external.
00000000  1                                                                          *)
```

```
00000000  1
00000000  1
00000000  1
00000000  1
00000000  1
00000000  1  (*
00000000  1                         *************************
00000000  1                         ***** WRITE_MSG_REC *****
00000000  1                         *************************
00000000  1                                                            *)
00000000  1  PROCEDURE WRITE_MSG_REC ( D_TYPE, MSG_NO:  S_INT; VAR REC_COUNT,
00000000  2                            FMGR_CODE:  S_INT ); EXTERNAL;
00000000  1  (*
00000000  1    Procedure WRITE_MSG_REC to write a display message record out to the
00000000  1    trace file.  Provided as a Pascal external.
00000000  1                                                            *)
00000000  1
00000000  1
00000000  1
00000000  1
00000000  1
00000000  1  (*
00000000  1                         ***********************
00000000  1                         ***** UNLOAD_DONE *****
00000000  1                         ***********************
00000000  1                                                            *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                            *)
00000000  1
00000000  1
00000000  1
00000000  1
00000000  1
00000000  1  (*
00000000  1                         **********************
00000000  1                         ***** PUSH_FRAME *****
00000000  1                         **********************
00000000  1                                                            *)
00000000  1  PROCEDURE PUSH_FRAME ( ENTRY:  FRAME_PTR_TYPE; VAR STACK:  FSTACK_TYPE;
00000000  2                         VAR TOP:  FSTACK_INDEX; VAR CODE:
00000000  2                         FSTACK_RETCODE ); EXTERNAL;
00000000  1  (*
00000000  1    Procedure PUSH_FRAME to push the given frame onto the given stack.
00000000  1    Provided as a Pascal external.
00000000  1                                                            *)
00000000  1
00000000  1
00000000  1
00000000  1
00000000  1
00000000  1  (*
00000000  1                         *********************
00000000  1                         ***** POP_FRAME *****
00000000  1                         *********************
00000000  1                                                            *)
00000000  1  PROCEDURE POP_FRAME ( VAR STACK:  FSTACK_TYPE; VAR TOP:  FSTACK_INDEX;
00000000  2                        VAR ENTRY:  FRAME_PTR_TYPE; VAR CODE:
00000000  2                        FSTACK_RETCODE ); EXTERNAL;
00000000  1  (*
00000000  1    Procedure POP_FRAME to pop the next frame off the given stack.
00000000  1    Provided as a Pascal external.
00000000  1                                                            *)
00000000  1
00000000  1
00000000  1
00000000  1
00000000  1
00000000  1  (*
00000000  1                         ************************
00000000  1                         ***** CREATE_FRAME *****
00000000  1                         ************************
00000000  1                                                            *)
```

```
00000000 1  PROCEDURE CREATE_FRAME ( VAR PROC_REC, PARENT_REC:  CMD_DATA_TYPE;
00000000 2                          VAR FRAME_INFO:  FRAME_REC_TYPE; VAR
00000000 2                          CRT_CODE:  S_INT ); EXTERNAL;
00000000 1  (*
00000000 1    Procedure CREATE_FRAME to create a frame record based on the given
00000000 1    procedure and parent information.  Provided as a Pascal external.
00000000 1                                                                    *)
00000000 1
00000000 1
00000000 1
00000000 1
00000000 1
00000000 1  (*
00000000 1                    ****************************
00000000 1                    ***** CLASS_PROC_DATA *****
00000000 1                    ****************************
00000000 1                                                                    *)
00000000 1  FUNCTION CLASS_PROC_DATA ( VAR PROC_REC:  CMD_DATA_TYPE; ADRS, PREV_PC,
00000000 2                          NEXT_PC:  L_INT ):  S_INT; EXTERNAL;
00000000 1  (*
00000000 1    Function CLASS_PROC_DATA to determine what type of procedural data
00000000 1    was captured.  Provided as a Pascal external.
00000000 1                                                                    *)
00000000 1
00000000 1
00000000 1
00000000 1
00000000 1
00000000 1  (*
00000000 1                         ******************
00000000 1                         ***** P_ADDR *****
00000000 1                         ******************
00000000 1                                                                    *)
00000000 1  PROCEDURE P_ADDR ( LOGICAL_ADDR:  L_INT; VAR PHYSICAL_ADDR:  L_INT );
00000000 2                    EXTERNAL;
00000000 1  (*
00000000 1    Procedure P_ADDR to return the physical address equivalent of the
00000000 1    given logical address.  Provided as a Pascal external.
00000000 1                                                                    *)
00000000 1
00000000 1
00000000 1
00000000 1
00000000 1
00000000 1  (*
00000000 1                        ********************
00000000 1                        ***** READ_REG *****
00000000 1                        ********************
00000000 1                                                                    *)
00000000 1  PROCEDURE READ_REG ( REG:  S_INT; VAR REG_VALUE:  L_INT ); EXTERNAL;
00000000 1  (*
00000000 1    Procdedure READ_REG to read the value of the given register ( 0 = PC,
00000000 1    1 = base ptr on entry, 2 = base ptr within ) from the emulator.  Data
00000000 1    is returned MSW, then LSW.  Provided as part of the message handler.
00000000 1                                                                    *)
00000000 1
00000000 1
00000000 1
00000000 1
00000000 1
00000000 1  (*
00000000 1                     *************************
00000000 1                     ***** GET_CALL_ADRS *****
00000000 1                     *************************
00000000 1                                                                    *)
00000000 1  FUNCTION GET_CALL_ADRS ( VAR PROC_REC:  CMD_DATA_TYPE ):  L_INT;
00000004 2                          EXTERNAL;
00000000 1  (*
00000000 1    Function GET_CALL_ADRS to determine the address from which the given
00000000 1    procedure was called.  Provided as a Pascal external.
00000000 1                                                                    *)
00000000 1
00000000 1
00000000 1
```

```
00000000  1
00000000  1
00000000  1  (*
00000000  1                              *************************
00000000  1                              ***** DEBUG_BREAK *****
00000000  1                              *************************
00000000  1                                                                   *)
00000000  1  PROCEDURE DEBUG_BREAK ( BCAUSE, BCLASS:  S_INT; PREV_PC, ADRS, NEXT_PC:
00000000  2                              L_INT ); EXTERNAL;
00000000  1  (*
00000000  1    Procedure DEBUG_BREAK to format up all the given information about
00000000  1    a break point, then put it up on the debug line.  Provided as a
00000000  1    Pascal external.
00000000  1                                                                   *)
00000000  1
00000000  1
00000000  1
00000000  1
00000000  1
00000000  1  $CALL_PC_SHORTS
00000000  1  (*
00000000  1                              *************************
00000000  1                              ***** SET_TD_PATHS *****
00000000  1                              *************************
00000000  1                                                                   *)
00000000  1  PROCEDURE SET_TD_PATHS ( VAR PROC_REC:  CMD_DATA_TYPE; ID:  S_INT;
00000000  2                              VAR HIGHS:  HIGH_LEVEL_SET; VAR SPEC:
00000000  2                              HW_SPEC_REC; VAR IO:  I_O_REC; VAR NEED_ENTRY,
00000000  2                              NEED_EXIT:  BOOLEAN; VAR SET_CODE:  S_INT );
00000000  2                              EXTERNAL;
00000000  1  (*
00000000  1    Procedure SET_TD_PATHS to set up the needed resource paths for the
00000000  1    given procedure.  Provided as a Pascal external.
00000000  1                                                                   *)
00000000  1
00000000  1
00000000  1
00000000  1
00000000  1
00000000  1  (*
00000000  1                              *************************
00000000  1                              ***** RESET_TD_RSRC *****
00000000  1                              *************************
00000000  1                                                                   *)
00000000  1  PROCEDURE RESET_TD_RSRC ( ENTRY_ON:  BOOLEAN; ID:  S_INT; VAR PROC_REC:
00000000  2                              CMD_DATA_TYPE; VAR SPEC:  HW_SPEC_REC );
00000000  2                              EXTERNAL;
00000000  1  (*
00000000  1    Procedure RESET_TD_RSRC to reset the entry resource in trace data
00000000  1    flow.  Provided as a Pascal external.
00000000  1                                                                   *)
00000000  1
00000000  1
00000000  1
00000000  1
00000000  1
00000000  1  (*
00000000  1                              **************************
00000000  1                              ***** TOGGLE_TD_RSRC *****
00000000  1                              **************************
00000000  1                                                                   *)
00000000  1  PROCEDURE TOGGLE_TD_RSRC ( TURN_ON:  BOOLEAN; ID:  S_INT; VAR PROC_REC:
00000000  2                              CMD_DATA_TYPE; VAR SPEC:  HW_SPEC_REC );
00000000  2                              EXTERNAL;
00000000  1  (*
00000000  1    Procedure TOGGLE_TD_RSRC to toggle the middle resource in trace
00000000  1    data flow.  Provided as a Pascal external.
00000000  1                                                                   *)
00000000  1
00000000  1
00000000  1
00000000  1
00000000  1
00000000  1  (*
00000000  1                              *************************
```

```
00000000 1                       ***** GET_TD_VARS *****
00000000 1                       ***********************
00000000 1                                                                     *)
00000000 1  PROCEDURE GET_TD_VARS ( VAR MEAS:  CMD_DATA_ARRAY; VAR SYMS:
00000000 2                       SYM_DESCRIPS; P_INDEX, P_DATA:  S_INT; VAR
00000000 2                       FRAME:  FRAME_REC_TYPE; PROC_COUNTER:  L_INT;
00000000 2                       VAR UN_COUNT, GET_CODE:  S_INT ); EXTERNAL;
00000000 1  (*
00000000 1    Procedure GET_TD_VARS to unload all variables associated with the
00000000 1    procedure whose index to the measurement structure is given.
00000000 1    Provided as a Pascal external.
00000000 1                                                                     *)
00000000 1
00000000 1
00000000 1
00000000 1
00000000 1
00000000 1  (*
00000000 1                        *********************
00000000 1                        ***** TD_PEXIT *****
00000000 1                        *********************
00000000 1                                                                     *)
00000000 1  PROCEDURE TD_PEXIT ( VAR MEAS:  CMD_DATA_ARRAY; VAR SYMS:
00000000 2                     SYM_DESCRIPS; VAR FLAGS:  FLAG_ARRAY_TYPE; MAC:
00000000 2                     S_INT; VAR SPEC:  HW_SPEC_REC; VAR UN_COUNT,
00000000 2                     TD_CODE:  S_INT );
00000000 2  (*
00000000 2    Procedure TD_PEXIT handles breaks on pseudo exit for the trace data
00000000 2    flow measurement.  It takes care of unloading data, updating the
00000000 2    current frame on exit, and adjusting the mid resource appropriately.
00000000 2    Data is unloaded if there is a current frame.  After that, the
00000000 2    procedure tries to restore the previous frame.  If it can, fine.
00000000 2    If it can't, the middle resource is activated to try and get a frame.
00000000 2    If there has been an overflow, the overflow count is decremented.
00000000 2
00000000 2    TD_PEXIT uses the following routines:  WRITE_ANLYS_REC, WRITE_MSG_REC,
00000000 2    UNLOAD_DONE, POP_FRAME, TOGGLE_TD_RSRC, and GET_TD_VARS.
00000000 2
00000000 2    Input:  1) MEAS, the structure describing the measurement at a high
00000000 2               level
00000000 2            2) SYMS, a list of all unique symbols involved in the
00000000 2               measurement
00000000 2            3) FLAGS, the flag word data structure containing the
00000000 2               most recently read hardware flags
00000000 2            4) MAC, the memory address counter off the memory board
00000000 2               obtained before unloading began
00000000 2            5) SPEC, the hardware specification which captured the
00000000 2               data
00000000 2            6) UN_COUNT, the previous # of states unloaded and
00000000 2               shipped out to the trace file
00000000 2    Output:  1) SPEC, the possibly modified hardware specification
00000000 2                structure
00000000 2             2) UN_COUNT, the updated # of states unloaded and output
00000000 2                to the trace file
00000000 2             3) TD_CODE, the return code indicating how things turned out:
00000000 2                 -26 indicates emulation error
00000000 2                 -19 indicates variable not active ( should never happen )
00000000 2                  -2 indicates measurement structure is corrupt
00000000 2                   0 indicates no error
00000000 2                   3 indicates file not found:  invalid DCB ( should never
00000000 2                     happen )
00000000 2                   5 indicates no free pages available
00000000 2                   7 indicates file corrupt
00000000 2                                                                     *)
00000000 2  VAR
00000000 2
00000000 2    STACK_CODE:  FSTACK_RETCODE; (* Return code from stack operations *)
00000004 2
00000004 2  BEGIN (* Procedure TD_PEXIT *)
00000004 2    TD_CODE := NO_ERROR;
0000000A 2
0000000A 2    (* Ship what we got *)
0000000A 2
0000000A 2    IF MEAS [ PROC_INDEX ].STATUS <> ON_ENTRY
00000026 2      THEN (* Want to collect variables at exit *)
00000026 2        BEGIN (* Get the suckers *)
```

```
00000026  2          IF UNLOAD_DONE ( UN_COUNT ) = FALSE
0000003C  2            THEN (* Haven't captured enough yet *)
0000003C  2              WRITE_ANLYS_REC ( PROC_EXIT, SYMBOL_INDEX, 0, SEXTET_REC,
0000003C  2                                UN_COUNT, TD_CODE );
00000062  2          IF ( TD_CODE = NO_ERROR ) AND
00000062  2             ( UNLOAD_DONE ( UN_COUNT ) = FALSE )
0000008C  2            THEN (* Exit record written *)
0000008C  2              IF FRAME_PACKAGE.CUR_FRAME = NIL
00000094  2                THEN (* Don't have a frame for this data *)
00000094  2                  WRITE_MSG_REC ( MSG_DATA, 16, UN_COUNT, TD_CODE )
000000B8  2                ELSE (* Do have a frame *)
000000B8  2                  GET_TD_VARS ( MEAS, SYMS, PROC_INDEX, PROC_EXIT,
000000B8  2                                FRAME_PACKAGE.CUR_FRAME^, 0, UN_COUNT,
000000B8  2                                TD_CODE )
000000EA  2        END; (* Get the suckers *)
000000EA  2
000000EA  2      IF FRAME_PACKAGE.CUR_FRAME <> NIL
000000F2  2        THEN (* Had a frame *)
000000F2  2          BEGIN (* Get rid of it *)
000000F2  2            DISPOSE ( FRAME_PACKAGE.CUR_FRAME );
00000104  2            FRAME_PACKAGE.CUR_FRAME := NIL
00000108  2          END; (* Get rid of it *)
00000108  2
00000108  2      (* Now try to get previous frame *)
00000108  2
00000108  2      IF FRAME_PACKAGE.OFC = 0
00000110  2        THEN (* Can try to get previous frame from stack *)
00000110  2          BEGIN (* Attempt to get previous frame *)
00000110  2            POP_FRAME ( FRAME_PACKAGE.STACK, FRAME_PACKAGE.INDEX,
00000110  2                        FRAME_PACKAGE.CUR_FRAME, STACK_CODE );
0000012C  2            IF STACK_CODE = -1
00000138  2              THEN (* Stack is empty *)
00000138  2                FRAME_PACKAGE.CUR_FRAME := NIL
0000013C  2          END (* Attempt to get previous frame *)
00000140  2        ELSE (* Still in overflow situation *)
00000140  2          FRAME_PACKAGE.OFC := FRAME_PACKAGE.OFC - 1;
00000144  2
00000144  2      (* Fire up middle resource if we don't have a frame yet,
00000144  2         otherwise turn it off *)
00000144  2
00000144  2      IF FRAME_PACKAGE.CUR_FRAME = NIL
0000014C  2        THEN (* Don't have a current frame *)
0000014C  2          (* Activate middle resource to try and get one *)
0000014C  2          TOGGLE_TD_RSRC ( TRUE, SYMBOL_INDEX, MEAS [ PROC_INDEX ], SPEC )
00000178  2        ELSE (* Have a current frame *)
00000178  2          (* Deactivate middle resource *)
00000178  2          TOGGLE_TD_RSRC ( FALSE, SYMBOL_INDEX, MEAS [ PROC_INDEX ], SPEC )
0000019E  2    END; (* Procedure TD_PEXIT *)
00000000  1
00000000  1
00000000  1
00000000  1
00000000  1
00000000  1    (*
00000000  1                        **********************
00000000  1                        ***** TD_PENTRY *****
00000000  1                        **********************
00000000  1                                                                    *)
00000000  1    PROCEDURE TD_PENTRY ( VAR MEAS:  CMD_DATA_ARRAY; VAR SYMS:
00000000  2                          SYM_DESCRIPS; VAR FLAGS:  FLAG_ARRAY_TYPE; MAC:
00000000  2                          S_INT; VAR SPEC:  HW_SPEC_REC; VAR UN_COUNT,
00000000  2                          TD_CODE:  S_INT );
00000000  2    (*
00000000  2      Procedure TD_PENTRY handles breaks on pseudo entry for the trace data
00000000  2      flow measurement.  It takes care of reseting the entry resource to
00000000  2      watch for entry, then unloads the data.
00000000  2
00000000  2      TD_PENTRY uses the following routines:  TD_PEXIT, WRITE_MSG_REC,
00000000  2      UNLOAD_DONE, RESET_TD_RSRC, and GET_TD_VARS.
00000000  2
00000000  2      Input:  1) MEAS, the structure describing the measurement at a high
00000000  2                 level
00000000  2              2) SYMS, a list of all unique symbols involved in the
00000000  2                 measurement
00000000  2              3) FLAGS, the flag word data structure containing the
```

```
00000000  2              most recently read hardware flags
00000000  2           4) MAC, the memory address counter off the memory board
00000000  2              obtained before unloading began
00000000  2           5) SPEC, the hardware specification which captured the
00000000  2              data
00000000  2           6) UN_COUNT, the previous # of states unloaded and
00000000  2              shipped out to the trace file
00000000  2   Output:  1) SPEC, the possibly modified hardware specification
00000000  2               structure
00000000  2            2) UN_COUNT, the updated # of states unloaded and output
00000000  2               to the trace file
00000000  2            3) TD_CODE, the return code indicating how things turned out:
00000000  2                -26 indicates emulation error
00000000  2                -19 indicates variable not active ( should never happen )
00000000  2                 -2 indicates measurement structure is corrupt
00000000  2                  0 indicates no error
00000000  2                  3 indicates file not found:  invalid DCB ( should never
00000000  2                    happen )
00000000  2                  5 indicates no free pages available
00000000  2                  7 indicates file corrupt
00000000  2                                                                      *)
00000000  2  VAR
00000000  2
00000000  2    FAKE_ENTRY:  L_INT; (* Pseudo entry address *)
00000004  2
00000004  2    FAKE_EXIT:  L_INT; (* Pseudo exit address *)
000001A6  2
000001A6  2  BEGIN (* Procedure TD_PENTRY *)
000001A6  2    TD_CODE := NO_ERROR;
000001AC  2
000001AC  2    (* Reset the entry resource to watch for entry *)
000001AC  2    RESET_TD_RSRC ( TRUE, SYMBOL_INDEX, MEAS [ PROC_INDEX ], SPEC );
000001D4  2
000001D4  2    (* Unload variables *)
000001D4  2    IF ( MEAS [ PROC_INDEX ].STATUS <> ON_EXIT ) AND
000001D4  2       ( UNLOAD_DONE ( UN_COUNT ) = FALSE )
00000218  2      THEN (* Want to collect variables at entry *)
00000218  2        IF FRAME_PACKAGE.CUR_FRAME = NIL
00000220  2          THEN (* Don't have a frame for this data *)
00000220  2            WRITE_MSG_REC ( MSG_DATA, 16, UN_COUNT, TD_CODE )
00000244  2          ELSE (* Do have a frame *)
00000244  2            GET_TD_VARS ( MEAS, SYMS, PROC_INDEX, PROC_ENTRY,
00000244  2                          FRAME_PACKAGE.CUR_FRAME^, 0, UN_COUNT,
00000244  2                          TD_CODE );
00000276  2    WITH MEAS [ PROC_INDEX ] DO
0000028A  2      BEGIN (* Compute pseudo entry/exit points *)
0000028A  2        FAKE_ENTRY := ENTRY + ENTRY_OFFSET;
00000298  2        FAKE_EXIT := EXIT - EXIT_OFFSET
000002A8  2      END; (* Compute pseudo entry/exit points *)
000002A8  2    IF ( TD_CODE = NO_ERROR ) AND ( FAKE_ENTRY >= FAKE_EXIT )
000002C2  2      THEN (* Pseudo entry overlaps pseudo exit *)
000002C2  2        (* Do all the exit stuff now *)
000002C2  2        TD_PEXIT ( MEAS, SYMS, FLAGS, MAC, SPEC, UN_COUNT, TD_CODE )
000002F4  2  END; (* Procedure TD_PENTRY *)
00000000  1
00000000  1
00000000  1
00000000  1
00000000  1
00000000  1  (*
00000000  1                        ************************
00000000  1                        ***** TD_OTHERWISE *****
00000000  1                        ************************
00000000  1                                                                      *)
00000000  1  PROCEDURE TD_OTHERWISE ( VAR MEAS:  CMD_DATA_ARRAY; VAR SYMS:
00000000  2                           SYM_DESCRIPS; VAR FLAGS:  FLAG_ARRAY_TYPE;
00000000  2                           MAC:  S_INT; VAR SPEC:  HW_SPEC_REC; VAR
00000000  2                           UN_COUNT, TD_CODE:  S_INT );
00000000  2  (*
00000000  2    Procedure TD_OTHERWISE handles breaks on entry or in the middle for
00000000  2    the trace data flow measurement.  It takes care of creating a new
00000000  2    current frame, unloading data, and adjusting the middle resource
```

```
00000000  2    appropriately.  After data is unloaded, the procedure tries to save
00000000  2    the current frame.  If it cannot, an overflow count is incremented.
00000000  2    Whether it can or not, it then tries to make a new one.  If it
00000000  2    succeeds, the middle resource is deactivated.
00000000  2
00000000  2    TD_OTHERWISE uses the following routines:  WRITE_ANLYS_REC,
00000000  2    UNLOAD_DONE, PUSH_FRAME, CREATE_FRAME, P_ADDR, GET_CALL_ADRS,
00000000  2    RESET_TD_RSRC, and TOGGLE_TD_RSRC.
00000000  2
00000000  2    Input:  1) MEAS, the structure describing the measurement at a high
00000000  2               level
00000000  2            2) SYMS, a list of all unique symbols involved in the
00000000  2               measurement
00000000  2            3) FLAGS, the flag word data structure containing the
00000000  2               most recently read hardware flags
00000000  2            4) MAC, the memory address counter off the memory board
00000000  2               obtained before unloading began
00000000  2            5) SPEC, the hardware specification which captured the
00000000  2               data
00000000  2            6) UN_COUNT, the previous # of states unloaded and
00000000  2               shipped out to the trace file
00000000  2   Output:  1) SPEC, the possibly modified hardware specification
00000000  2               structure
00000000  2            2) UN_COUNT, the updated # of states unloaded and output
00000000  2               to the trace file
00000000  2            3) TD_CODE, the return code indicating how things turned out:
00000000  2                 -26 indicates emulation error
00000000  2                 -16 indicates frame cannot be created ( should never
00000000  2                       happen )
00000000  2                   0 indicates no error
00000000  2                   3 indicates file not found:  invalid DCD ( should never
00000000  2                       happen )
00000000  2                   5 indicates no free pages available
00000000  2                   7 indicates file corrupt
00000000  2                                                                        *)
00000000  2  VAR
00000000  2
00000000  2    CALL_ADRS:  L_INT; (* Calling address *)
00000004  2
00000004  2    STACK_CODE:  FSTACK_RETCODE; (* Return code from stack operations *)
000002FC  2
000002FC  2  BEGIN (* Procedure TD_OTHERWISE *)
000002FC  2    TD_CODE := NO_ERROR;
00000302  2
00000302  2    IF FRAME_PACKAGE.CUR_FRAME <> NIL
0000030A  2      THEN (* Recursive *)
0000030A  2        BEGIN (* Save current frame *)
0000030A  2
0000030A  2          (* Try to save current frame *)
0000030A  2
0000030A  2          PUSH_FRAME ( FRAME_PACKAGE.CUR_FRAME, FRAME_PACKAGE.STACK,
0000030A  2                       FRAME_PACKAGE.INDEX, STACK_CODE );
00000326  2          IF STACK_CODE = -1
00000332  2            THEN (* Couldn't save frame *)
00000332  2              BEGIN (* Increment overflow count *)
00000332  2                FRAME_PACKAGE.OFC := FRAME_PACKAGE.OFC + 1;
00000336  2                DISPOSE ( FRAME_PACKAGE.CUR_FRAME );
00000348  2                FRAME_PACKAGE.CUR_FRAME := NIL
0000034C  2              END (* Increment overflow count *)
0000034C  2        END; (* Save current frame *)
0000034C  2
0000034C  2    IF DATA_TYPE = PROC_ENTRY
00000358  2      THEN (* This is a real entry point *)
00000358  2        BEGIN (* Set up to stop on pseudo entry *)
00000358  2          RESET_TD_RSRC ( FALSE, SYMBOL_INDEX, MEAS [ PROC_INDEX ],
00000358  2                          SPEC );
0000037E  2          IF ( MEAS [ PROC_INDEX ].STATUS <> ON_EXIT ) AND
0000037E  2            ( UNLOAD_DONE ( UN_COUNT ) = FALSE )
000003C2  2            THEN (* Need entry record *)
000003C2  2              BEGIN (* Write out entry record *)
000003C2  2                CALL_ADRS := GET_CALL_ADRS ( MEAS [ PROC_INDEX ] );
000003DE  2                IF CALL_ADRS <> -1
000003EC  2                  THEN (* Software can do better than hardware *)
000003EC  2                    (* Logical --> physical *)
```

```
000003EC  2                 P_ADDR ( CALL_ADRS, SEXTET_REC.PC );
000003FA  2               WRITE_ANLYS_REC ( PROC_ENTRY, SYMBOL_INDEX, 0,
000003FA  2                                 SEXTET_REC, UH_COUNT, TD_CODE )
00000420  2             END (* Write out entry record *)
00000420  2          END; (* Set up to stop on pseudo entry *)
00000420  2
00000420  2    (* Now, try and create a new frame *)
00000420  2
00000420  2    IF TD_CODE = NO_ERROR
0000042A  2      THEN (* We unloaded successfully *)
0000042A  2        BEGIN (* Create frame record *)
0000042A  2          NEW ( FRAME_PACKAGE.CUR_FRAME );
0000043C  2          CREATE_FRAME ( MEAS [ PROC_INDEX ], MEAS [ PROC_INDEX-1 ],
0000043C  2                         FRAME_PACKAGE.CUR_FRAME^, TD_CODE )
00000472  2        END; (* Create frame record *)
00000472  2
00000472  2    (* Turn off middle resource if we have a frame *)
00000472  2
00000472  2    IF TD_CODE = CANT_MAKE_FRAME
00000480  2      THEN (* Want to try again *)
00000480  2        BEGIN (* Reset *)
00000480  2          TD_CODE := NO_ERROR;
00000486  2          DISPOSE ( FRAME_PACKAGE.CUR_FRAME );
00000498  2          FRAME_PACKAGE.CUR_FRAME := NIL;
0000049C  2          TOGGLE_TD_RSRC ( TRUE, SYMBOL_INDEX, MEAS [ PROC_INDEX ], SPEC )
000004C4  2        END (* Reset *)
000004C8  2      ELSE (* Want to deactivate don't care resource *)
000004C8  2        (* Turn it off *)
000004C8  2        TOGGLE_TD_RSRC ( FALSE, SYMBOL_INDEX, MEAS [ PROC_INDEX ], SPEC )
000004EE  2  END; (* Procedure TD_OTHERWISE *)
00000000  1
00000000  1
00000000  1
00000000  1
00000000  1
00000000  1  (*
00000000  1                          ********************
00000000  1                          ***** LOAD_TD *****
00000000  1                          ********************
00000000  1                                                                   *)
00000000  1  $GLOBPROC ON$
00000000  1  PROCEDURE LOAD_TD ( VAR MEAS_:  CMD_DATA_ARRAY; VAR SYMS_:
00000000  2                      SYM_DESCRIPS; VAR SPEC_:  HW_SPEC_REC; VAR R_CODE:
00000000  2                      S_INT );
00000000  2  (*
00000000  2    Procedure LOAD_TD is the pre-processor for the trace data flow
00000000  2    measurement.  It loads the appropriate hardware data structures with
00000000  2    the necessary information to create a trace data flow measurement
00000000  2    when loaded into the hardware.  Procedure finds all symbols which
00000000  2    are procedures and assigns resource paths to their entry and exit
00000000  2    points.  The appropriate state machine is built around these
00000000  2    paths which allows breaks on all entries/exits. If one function
00000000  2    generator is filled, the procedure switches to the next function
00000000  2    generator.  If at any time during the process a required resource
00000000  2    is not available, the translation is aborted and an appropriate
00000000  2    error code is returned to the caller.
00000000  2
00000000  2    LOAD_TD uses the following routines:  START_GEN, CLOSE_OR_NODE,
00000000  2    SET_FEATURE, and SET_TD_PATHS.
00000000  2
00000000  2    Input:  1) MEAS_, the input structure to the loader indicating
00000000  2               what the measurement is
00000000  2            2) SYMS_, a list of all unique symbols involved in the
00000000  2               measurement
00000000  2            3) SPEC_, the initialized hardware specification structure
00000000  2    Output:  1) SPEC_, the completed hardware record containing
00000000  2                specifications for usage of the:
00000000  2               a) low level resources,
00000000  2               b) high level resources,
00000000  2               c) fast sequencer,
00000000  2               d) micro-code occurance counters,
00000000  2               e) function generators,
00000000  2               f) misc. signals,
00000000  2               g) occurance counters,
00000000  2               h) extraneous features
```

```
00000000  2            2) R_CODE, a code specifying how the load turned out:
00000000  2               -6 indicates translation error:  function description
00000000  2                  overflow
00000000  2               -4 indicates out of high level hardware resources
00000000  2               -3 indicates out of low level hardware resources
00000000  2                0 indicates no error:  load completed
00000000  2                                                                          *)
00000000  2 VAR
00000000  2
00000000  2   I:  S_INT; (* WHILE loop index *)
00000002  2
00000002  2   STATE:  STATE_REC_PTR; (* Current function generator state node *)
00000006  2
00000006  2   IO:  I_O_REC_PTR; (* Current function generator input/output node *)
0000000A  2
0000000A  2   HL_SET:  HIGH_LEVEL_SET; (* Current set of useable high level
0000000C  2                              resources *)
0000000C  2
0000000C  2   ADD_ENTRY:  BOOLEAN; (* Flag indicating proc entry path is needed -
0000000D  2                           used when switching generators *)
0000000D  2
0000000D  2   ADD_EXIT:  BOOLEAN; (* Flag indicating proc exit path is needed -
000004F6  2                           used when switching generators *)
000004F6  2
000004F6  2 BEGIN (* Procedure LOAD_TD *)
000004F6  2   R_CODE := NO_ERROR; (* Be optimistic *)
000004FC  2
000004FC  2   (* Initialize a bunch of stuff for pre AND post-processors *)
000004FC  2
000004FC  2   WITH FRAME_PACKAGE DO
00000504  2     BEGIN (* Initialize it *)
00000504  2       CUR_FRAME := NIL;
00000506  2       INDEX := -1;
00000510  2       OFC := 0;
00000518  2       REC_NUM := 0
00000520  2     END; (* Initialize it *)
00000520  2
00000520  2   (* Start state machine:  use Y generator first *)
00000520  2
00000520  2   START_GEN ( SPEC_.FUNC_GENERATORS [ Y ], 0, 0, STATE, IO, HL_SET );
00000548  2   (* Turn on enable emulation break *)
00000548  2   SET_FEATURE ( ON, SPEC_.FEATURES [ BREAK_ON_STOP ] );
0000055E  2
0000055E  2   (* Take a deep breath:  we're going down for a long, long time *)
0000055E  2
0000055E  2   ADD_ENTRY := TRUE;
00000564  2   ADD_EXIT := TRUE;
0000056A  2   I := 0;
0000056E  2   WHILE ( I < SYMS_.SYMBOL_COUNT ) AND ( R_CODE = NO_ERROR ) DO
00000590  2     WITH MEAS_ [ SYMS_.SYMBOL_ARRAY [ I ].DESCRIP_INDEX ] DO
000005B0  2       BEGIN (* Set up resources to watch all proc entries/exits *)
000005B0  2         IF OP_CODE = PROC_OP
000005BA  2           THEN (* This symbol is a procedure *)
000005BA  2             BEGIN (* Watch this procedure's entry and exit *)
000005BA  2
000005BA  2               (* Assign all the necessary resources and add to I/O
000005BA  2                  node *)
000005BA  2
000005BA  2               PROC_INDEX := SYMS_.SYMBOL_ARRAY [ I ].DESCRIP_INDEX;
000005CC  2               SET_TD_PATHS ( MEAS_ [ PROC_INDEX ], I, HL_SET, SPEC_,
000005CC  2                              IO^, ADD_ENTRY, ADD_EXIT, R_CODE );
00000604  2               IF R_CODE = NO_ERROR
0000060E  2                 THEN (* Will need to add an entry/exit on next pass
0000060E  2                         thru *)
0000060E  2                   BEGIN (* Reset flags *)
0000060E  2                     ADD_ENTRY := TRUE;
00000614  2                     ADD_EXIT := TRUE
0000061A  2                   END; (* Reset flags *)
0000061A  2
0000061A  2               (* Switch generators if necessary *)
0000061A  2
0000061A  2               IF ( R_CODE = OUT_OF_H_RSRCS ) AND ( SPEC_.
0000061A  2                    FUNC_GENERATORS [ X ].STATE_MACH_PTR = NIL )
00000642  2                 THEN (* Time to change function generators *)
```

```
00000642  2                 BEGIN (* Switch to X function generator *)
00000642  2                   (* Close out Y *)
00000642  2                   CLOSE_OR_NODE ( I STORE, STOP 1, IO^, R_CODE );
0000065E  2                   (* Open up X *)
0000065E  2                   START_GEN ( SPEC_.FUNC_GENERATORS [ X ], 0, 0,
0000065E  2                               STATE, IO, HL_SET );
00000684  2                   I := I - 1 (* Back up one and try again *)
00000688  2                 END (* Switch to X function generator *)
00000688  2               END; (* Watch this procedure's entry and exit *)
00000688  2         I := I + 1
0000068C  2       END; (* Set up resources to watch all proc entries/exits *)
00000690  2
00000690  2   (* Close out the last function generator *)
00000690  2
00000690  2   IF R_CODE = NO_ERROR
0000069A  2     THEN (* All went well *)
0000069A  2       (* Close out this function generator *)
0000069A  2       CLOSE_OR_NODE ( I STORE, STOP 1, IO^, R_CODE )
000006B6  2 END; (* Procedure LOAD_TD *)
00000000  1 $GLOBPROC OFF$
00000000  1
00000000  1
00000000  1
00000000  1
00000000  1
00000000  1 (*
00000000  1                        *********************
00000000  1                        ***** UNLOAD_TD *****
00000000  1                        *********************
00000000  1                                                          *)
00000000  1 $GLOBPROC ON$
00000000  1 PROCEDURE UNLOAD_TD ( VAR MEAS_:  CMD_DATA_ARRAY; VAR SYMS_:
00000000  2                       SYM_DESCRIPS; VAR FLAGS_:  FLAG_ARRAY_TYPE; MAC_:
00000000  2                       S_INT; VAR SPEC_:  HW_SPEC_REC; VAR UNLD_COUNT,
00000000  2                       R_CODE:  S_INT );
00000000  2 (*
00000000  2   Procedure UNLOAD_TD is the post-processor for the trace data flow
00000000  2   measurement.  It unloads the hardware and emulation memory, classifies
00000000  2   the data, and creates valid trace file data records.  UNLOAD_TD
00000000  2   determines where we broke ( what procedure and where in that
00000000  2   procedure ).  If on entry, the previous frame, if any, is stacked and
00000000  2   a new frame is created.  If on pseudo entry, all variables being
00000000  2   traced on entry are unloaded.  If on pseudo exit, all variables being
00000000  2   traced on exit are likewise unloaded and the stack of frame records is
00000000  2   popped if necessary.
00000000  2
00000000  2   UNLOAD_TD uses the following routines:  TD_PEXIT, TD_PENTRY,
00000000  2   TD_OTHERWISE, GET_DATA, CLASSIFY_BREAK, FIND_STATIC, UNLOAD_DONE,
00000000  2   CLASS_PROC_DATA, P_ADDR, READ_REG, and DEBUG_BREAK.
00000000  2
00000000  2   Input:  1) MEAS_, the structure describing the measurement at a high
00000000  2              level
00000000  2           2) SYMS_, a list of all unique symbols involved in the
00000000  2              measurement ( ie procedures and variables )
00000000  2           3) FLAGS_, the flag word data structure containing the
00000000  2              most recently read hardware flags
00000000  2           4) MAC_, the memory address counter off the memory board
00000000  2              obtained before unloading began
00000000  2           5) SPEC_, the hardware specification which captured the
00000000  2              data
00000000  2           6) UNLD_COUNT, the previous # of states unloaded and
00000000  2              shipped out to the trace file
00000000  2   Output:  1) SPEC_, the possibly modified hardware specification
00000000  2               structure
00000000  2            2) UNLD_COUNT, the updated # of states unloaded and output
00000000  2               to the trace file
00000000  2            3) R_CODE, the return code indicating how things turned out:
00000000  2                -26 indicates emulation error
00000000  2                -19 indicates variable not active ( should never happen )
00000000  2                -16 indicates frame cannot be created ( should never
00000000  2                    happen )
00000000  2                 -2 indicates measurement structure is corrupt
```

```
00000000  2                 0 indicates no error:  the entire measurement was
00000000  2                   completed without an incident serious enough to
00000000  2                   warrant the return of a depressing, irrevokable
00000000  2                   non-zero error code which would indicate that the
00000000  2                   measurement cannot be finished without divine
00000000  2                   intervention
00000000  2                 3 indicates file not found:  invalid DCB ( should never
00000000  2                   happen )
00000000  2                 5 indicates no free pages available
00000000  2                 7 indicates file corrupt
00000000  2               100 indicates so far so good:  keep doing whatever we
00000000  2                   were doing
00000000  2                                                                    *)
00000000  2 VAR
00000000  2
00000000  2   BREAK_CAUSE:  S_INT; (* Cause of break *)
00000002  2
00000002  2   NEXT_PC:  L_INT; (* Address of next instruction *)
00000006  2
00000006  2   CURRENT_BASE:  DOUBLE_ARRAY; (* Storage for current base count *)
000006BE  2
000006BE  2 BEGIN (* Procedure UNLOAD_TD *)
000006BE  2   R_CODE := NO_ERROR; (* Wishing *)
000006C4  2
000006C4  2   (* Find out if we captured anything and why we stopped  *)
000006C4  2
000006C4  2   BREAK_CAUSE := CLASSIFY_BREAK ( FLAGS_, SPEC_.FEATURES );
000006DE  2   IF ( BREAK_CAUSE > 0 ) AND
000006DE  2      ( STORE_BIT IN FLAG_1_SET ( FLAGS_ [ FLAG_1 ] ) )
000006FE  2     THEN (* We broke and stored something *)
000006FE  2       BEGIN (* Find out what procedure and where we broke *)
000006FE  2         (* Pull the sextet out of the hardware *)
000006FE  2         GET_DATA ( MAC_-1, 1, SPEC_.FEATURES, CURRENT_BASE,
000006FE  2                    SEXTET_REC );
00000726  2         SYMBOL_INDEX := FIND_STATIC ( MEAS_, SYMS_, SEXTET_REC.ADRS );
00000746  2         IF SYMBOL_INDEX = -1
00000752  2           THEN (* No related symbol *)
00000752  2             DATA_TYPE := GARBAGE
0000075C  2           ELSE (* Found procedure we broke on *)
0000075C  2             BEGIN (* Classify the procedure data *)
0000075C  2               PROC_INDEX := SYMS_.SYMBOL_ARRAY [ SYMBOL_INDEX ].
0000075C  2                             DESCRIP_INDEX;
00000772  2               READ_REG ( 0, NEXT_PC );
00000780  2               P_ADDR ( NEXT_PC, NEXT_PC ); (* Logical --> physical *)
00000790  2               DATA_TYPE := CLASS_PROC_DATA ( MEAS_ [ PROC_INDEX ],
00000790  2                              SEXTET_REC.ADRS, SEXTET_REC.PC, NEXT_PC );
000007BC  2               IF ( BREAK_CAUSE = 1 ) AND ( DATA_TYPE = C_ZONE )
000007DE  2                 THEN (* Disabled in the C zone *)
000007DE  2                   DATA_TYPE := GARBAGE (* Don't do anything *)
000007E4  2             END (* Classify the procedure data *)
000007E4  2       END  (* Find out what procedure and where we broke *)
000007E8  2     ELSE (* We broke because of user halt, mem full, etc. *)
000007E8  2       BEGIN (* Don' do anything *)
000007E8  2         SEXTET_REC.PC := 0; (* Clear values for debug *)
000007EC  2         SEXTET_REC.ADRS := 0;
000007F0  2         NEXT_PC := 0;
000007F4  2         DATA_TYPE := GARBAGE (* Make sure we don't do anything *)
000007FA  2       END; (* Don't do anyting *)
000007FA  2
000007FA  2   IF DEBUG_FLAG = DEBUG_TRACEDAT
00000806  2     THEN (* Debug option is on *)
00000806  2       DEBUG_BREAK ( BREAK_CAUSE, DATA_TYPE, SEXTET_REC.PC,
00000806  2                     SEXTET_REC.ADRS, NEXT_PC );
00000826  2
00000826  2   (* Do something depending on data type *)
00000826  2
00000826  2   CASE DATA_TYPE OF
00000830  2
00000830  2     PSEUDO_EXIT:  (* Broke on procedure pseudo exit *)
00000830  2       TD_PEXIT ( MEAS_, SYMS_, FLAGS_, MAC_, SPEC_, UNLD_COUNT,
00000830  2                  R_CODE );
00000866  2     PSEUDO_ENTRY:  (* Broke on procedure pseudo entry *)
00000866  2       TD_PENTRY ( MEAS_, SYMS_, FLAGS_, MAC_, SPEC_, UNLD_COUNT,
00000866  2                   R_CODE );
```

```
0000089C  2      GARBAGE:  (* Garbage data *)
000008A0  2        ;(* Do nothing *)
000008A0  2      OTHERWISE (* Broke on procedure entry or in middle *)
000008A0  2        TD_OTHERWISE ( MEAS_, SYMS_, FLAGS_, MAC_, SPEC_, UNLD_COUNT,
000008A0  2                       R_CODE )
000008D2  2    END; (* Of case statement *)
000008FC  2
000008FC  2    IF ( R_CODE = NO_ERROR ) AND ( BREAK_CAUSE = 2 ) AND
000008FC  2       ( UNLOAD_DONE ( UNLD_COUNT ) = FALSE )
00000936  2      THEN (* Want to keep going because we broke for the measurement and
00000936  2              haven't unloaded as much as we should *)
00000936  2        R_CODE := KEEP_GOING
0000093E  2  END; (* Procedure UNLOAD_TD *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $TITLE "Soda Dynamic Controller:  Trace Data Utils"
00000000  1  PROGRAM TD_UTLS;
00000000  1  (*
00000000  1  ******************************** TD_UTLS ********************************
00000000  1    TD_UTLS is the module containing utilities used by the trace
00000000  1    data flow measurement.  These utilities are accessed by the pre and
00000000  1    post processors for creating/unloading the measurement.
00000000  1    Author:  Kip Fulghum
00000000  1    Date:  8-27-84  Revised:  11-2-84
00000000  1  ***************************************************************************
00000000  1
00000000  1    TD_UTLS contains the following routines:
00000000  1    -Global procedure SET_TD_PATHS sets up the needed resource paths for
00000000  1     the given procedure.
00000000  1    -Global procedure RESET_TD_RSRC resets the entry resource in trace
00000000  1     data flow.
00000000  1    -Global procedure TOGGLE_TD_RSRC toggles the middle resource in trace
00000000  1     data flow.
00000000  1    -Global procedure GET_TD_VARS unloads all variables associated with
00000000  1     the procedure whose index to the measurement structure is given.
00000000  1
00000000  1    In addition, TD_UTLS uses the following external routines:
00000000  1    ASSIGN_LL_RSRC, ADD_PATH, CHANGE_LL_RSRC, FIND_STATIC, FIND_DYNAMIC,
00000000  1    FIND_INDEX, TEST_BITS, UNLOAD_DONE,
00000000  1    GET_VALUE_MASK, GET_BUS_MASK, GET_DEPTH, P_ADDR, and UNLOAD_VARIABLE.
00000000  1                                                                          *)
00000000  1  (*
00000000  1                          **************************
00000000  1                          ***** Include Files *****
00000000  1                          **************************
00000000  1                                                                          *)
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1
00000000  1
00000000  1
00000000  1
00000000  1  $CALL_ABS_LONG$
00000000  1  (*
00000000  1                          **************************
00000000  1                          ***** ASSIGN_LL_RSRC *****
00000000  1                          **************************
00000000  1                                                                          *)
```

```
00000000 1  FUNCTION ASSIGN_LL_RSRC ( RSRC_TYPE:  LL_TYPE; RSRC_ID:  S_INT;
00000000 2                            LO_VALUE, LO_MASK, HI_VALUE, HI_MASK:
00000000 2                            L_INT; VAR LL_ARRAY:  LL_ARRAY_TYPE ):  S_INT;
00000002 2                            EXTERNAL;
00000000 1  (*
00000000 1    Function ASSIGN_LL_RSRC to allocate a low level resource from those
00000000 1    available for use by the caller.  Provided as a Pascal external.
00000000 1                                                                      *)
00000000 1
00000000 1
00000000 1
00000000 1
00000000 1
00000000 1  (*
00000000 1                          ********************
00000000 1                          ***** ADD_PATH *****
00000000 1                          ********************
00000000 1                                                                      *)
00000000 1  PROCEDURE ADD_PATH ( RSRC_TYPE:  LL_TYPE; PATH_ID:  S_INT; LO_VALUE,
00000000 2                       LO_MASK, HI_VALUE, HI_MASK:  L_INT; VAR
00000000 2                       POS_HL_SET:  HIGH_LEVEL_SET; VAR LO_ARRAY:
00000000 2                       LL_ARRAY_TYPE; VAR HI_ARRAY:  HL_ARRAY_TYPE;
00000000 2                       VAR IO:  I_O_REC; VAR CODE:  S_INT ); EXTERNAL;
00000000 1  (*
00000000 1    Procedure ADD_PATH to create and add a low to high level resource
00000000 1    path to the given function generator I/O node's input function
00000000 1    description.  Provided as a Pascal external.
00000000 1
00000000 1                                                                      *)
00000000 1
00000000 1
00000000 1
00000000 1
00000000 1  (*
00000000 1                        ***************************
00000000 1                        ***** CHANGE_LL_RSRC *****
00000000 1                        ***************************
00000000 1                                                                      *)
00000000 1  PROCEDURE CHANGE_LL_RSRC ( RSRC_ID:  S_INT; LO_VALUE, LO_MASK,
00000000 2                             HI_VALUE, HI_MASK:  L_INT; VAR LL_ARRAY:
00000000 2                             LL_ARRAY_TYPE ); EXTERNAL;
00000000 1  (*
00000000 1    Procedure CHANGE_LL_RSRC to change the values assigned to a low level
00000000 1    resource.  Provided as a Pascal external.
00000000 1                                                                      *)
00000000 1
00000000 1
00000000 1
00000000 1
00000000 1
00000000 1  (*
00000000 1                        ************************
00000000 1                        ***** FIND_STATIC *****
00000000 1                        ************************
00000000 1                                                                      *)
00000000 1  FUNCTION FIND_STATIC ( VAR MEAS_STRUCT:  CMD_DATA_ARRAY; VAR
00000000 2                         SYM_STRUCT:  SYM_DESCRIPS; EMUL_ADRS:  L_INT ):
00000000 2                         S_INT; EXTERNAL;
00000000 1  (*
00000000 1    Function FIND_STATIC returns the index of the record in the
00000000 1    symbol table structure related to the given static data.  Provided
00000000 1    as a Pascal external.
00000000 1                                                                      *)
00000000 1
00000000 1
00000000 1
00000000 1
00000000 1
00000000 1  (*
00000000 1                        *************************
00000000 1                        ***** FIND_DYNAMIC *****
00000000 1                        *************************
00000000 1                                                                      *)
00000000 1  FUNCTION FIND_DYNAMIC ( VAR MEAS_STRUCT:  CMD_DATA_ARRAY; VAR
00000000 2                          SYM_STRUCT:  SYM_DESCRIPS; EMUL_OFST:
00000000 2                          L_INT; PROG, PROC:  S_INT ):  S_INT; EXTERNAL;
```

```
00000000  1  (*
00000000  1   Function FIND_DYNAMIC returns the index of the record in the
00000000  1   symbol table structure related to the given dynamic data.  Provided
00000000  1   as a Pascal external.
00000000  1                                                                   *)
00000000  1
00000000  1
00000000  1
00000000  1
00000000  1
00000000  1
00000000  1  (*
00000000  1                          ***********************
00000000  1                          ***** FIND_INDEX *****
00000000  1                          ***********************
00000000  1                                                                   *)
00000000  1  FUNCTION FIND_INDEX ( VAR SYM_STRUCT:  SYM_DESCRIPS; MEAS_INDEX:
00000000  2                        S_INT ):  S_INT; EXTERNAL;
00000000  1  (*
00000000  1   Function FIND_INDEX to return the index of the symbol whose
00000000  1   measurement structure index is given.  Provided as a Pascal external.
00000000  1                                                                   *)
00000000  1
00000000  1
00000000  1
00000000  1
00000000  1
00000000  1  (*
00000000  1                          **********************
00000000  1                          ***** TEST_BITS *****
00000000  1                          **********************
00000000  1                                                                   *)
00000000  1  FUNCTION TEST_BITS ( BIT_WORD, TEST_WORD:  L_INT ):  BOOLEAN; EXTERNAL;
00000000  1  (*
00000000  1   Function TEST_BITS to see if all of the bits indicated in BIT_WORD
00000000  1   are set in TEST_WORD, ie "AND" both words and see if the result is
00000000  1   equal to BIT_WORD.  Provided as an assembly language external.
00000000  1                                                                   *)
00000000  1
00000000  1
00000000  1
00000000  1
00000000  1
00000000  1
00000000  1  (*
00000000  1                          ************************
00000000  1                          ***** UNLOAD_DONE *****
00000000  1                          ************************
00000000  1
00000000  1  FUNCTION UNLOAD_DONE ( COUNT:  S_INT ):  BOOLEAN; EXTERNAL;
00000000  1  (*
00000000  1   Function UNLOAD_DONE to determine when the unload sequence is done.
00000000  1   Provided as a Pascal external.
00000000  1                                                                   *)
00000000  1
00000000  1
00000000  1
00000000  1
00000000  1
00000000  1
00000000  1  (*
00000000  1                          ***************************
00000000  1                          ***** GET_VALUE_MASK *****
00000000  1                          ***************************
00000000  1                                                                   *)
00000000  1
00000000  1  PROCEDURE GET_VALUE_MASK ( ACCESS:  S_INT; VAR VALUE, MASK:  L_INT );
00000000  2                             EXTERNAL;
00000000  1  (*
00000000  1   Procedure GET_VALUE_MASK to determine the appropriate value and
00000000  1   mask for tracing different processor status, ie reads, writes, etc.
00000000  1   Provided as a Pascal external.
00000000  1                                                                   *)
00000000  1
00000000  1
00000000  1
00000000  1
00000000  1
00000000  1
00000000  1  (*
00000000  1                          **************************
```

```
00000000 1                         ***** GET_BUS_MASK *****
00000000 1                         ************************
00000000 1                                                                        *)
00000000 1  FUNCTION GET_BUS_MASK ( BUS:  S_INT ):  L_INT; EXTERNAL;
00000000 1  (*
00000000 1    Function GET_BUS_MASK to return the processor specific mask containing
00000000 1    all 1s for all bits on the given bus.  Provided as a Pascal external.
00000000 1                                                                        *)
00000000 1
00000000 1
00000000 1
00000000 1
00000000 1
00000000 1  (*
00000000 1                         **********************
00000000 1                         ***** GET_DEPTH *****
00000000 1                         **********************
00000000 1                                                                        *)
00000000 1  FUNCTION GET_DEPTH:  L_INT; EXTERNAL;
00000000 1  (*
00000000 1    Function GET_DEPTH to return the appropriate processor queue depth
00000000 1    offset.  Provided as a Pascal external.
00000000 1                                                                        *)
00000000 1
00000000 1
00000000 1
00000000 1
00000000 1
00000000 1  (*
00000000 1                         ********************
00000000 1                         ***** P_ADDR *****
00000000 1                         ********************
00000000 1                                                                        *)
00000000 1  PROCEDURE P_ADDR ( LOGICAL_ADDR:  L_INT; VAR PHYSICAL_ADDR:  L_INT );
00000000 2                 EXTERNAL;
00000000 1  (*
00000000 1    Procedure P_ADDR to return the physical address equivalent of the
00000000 1    given logical address.  Provided as a Pascal external.
00000000 1                                                                        *)
00000000 1
00000000 1
00000000 1
00000000 1
00000000 1
00000000 1  (*
00000000 1                         ****************************
00000000 1                         ***** UNLOAD_VARIABLE *****
00000000 1                         ****************************
00000000 1                                                                        *)
00000000 1  PROCEDURE UNLOAD_VARIABLE ( VAR PROC_REC, VAR_REC, OFST_REC:
00000000 2                         CMD_DATA_TYPE; VAR FRAME_REC:
00000000 2                         FRAME_REC_TYPE; SVM_INDEX:  S_INT;
00000000 2                         P_COUNTER:  L_INT; VAR REC_COUNT,
00000000 2                         UNLD_CODE:  S_INT ); EXTERNAL;
00000000 1  (*
00000000 1    Procedure UNLOAD_VARIABLE to unload a given variable from emulation
00000000 1    memory and write it out to the trace file.  Provided as a Pascal
00000000 1    external.
00000000 1                                                                        *)
00000000 1
00000000 1
00000000 1
00000000 1
00000000 1
00000000 1  (*
00000000 1                         *************************
00000000 1                         ***** SET_TD_PATHS *****
00000000 1                         *************************
00000000 1                                                                        *)
00000000 1  $GLOBPROC ON$
00000000 1  PROCEDURE SET_TD_PATHS ( VAR PROC_REC:  CMD_DATA_TYPE; ID:  S_INT;
00000000 2                         VAR HIGHS:  HIGH_LEVEL_SET; VAR SPEC:
00000000 2                         HW_SPEC_REC; VAR IO:  I_O_REC; VAR NEED_ENTRY,
00000000 2                         NEED_EXIT:  BOOLEAN; VAR SET_CODE:  S_INT );
00000000 2  (*
```

```
00000000  2     Procedure SET_TD_PATHS to set up the needed resource paths for the
00000000  2     given procedure.  Procedure simply adds all needed paths to the given
00000000  2     I/O node, one at a time.  If any path cannot be created, an error is
00000000  2     returned.
00000000  2
00000000  2     SET_TD_PATHS uses the following routines:  ASSIGN_LL_RSRC, ADD_PATH,
00000000  2     GET_VALUE_MASK, GET_BUS_MASK, GET_DEPTH, and P_ADDR.
00000000  2
00000000  2     Input:  1) PROC_REC, the record describing the procedure to be
00000000  2                traced
00000000  2             2) ID, the basis for the resource I.D.s to be assigned to
00000000  2                the paths ( if 0, the opcode resource is turned on )
00000000  2             3) HIGHS, the set of possible high level resources to choose
00000000  2                from when creating the paths
00000000  2             4) SPEC, the current hardware specification
00000000  2             5) IO, the input/output record to add the paths to
00000000  2             6) NEED_ENTRY, a flag indicating whether an entry path is
00000000  2                needed ( TRUE ) or not ( FALSE )
00000000  2             7) NEED_EXIT, a flag indicating whether an exit path is
00000000  2                needed ( TRUE ) or not ( FALSE )
00000000  2     Output:  1) SPEC, the modified hardware specification from which the
00000000  2                 resources were allocated
00000000  2              2) IO, the modified input/output record
00000000  2              3) NEED_ENTRY, the updated entry flag indicating if we still
00000000  2                 need an entry path ( TRUE ) or not ( FALSE )
00000000  2              4) NEED_EXIT, the updated exit flag indicating if we still
00000000  2                 need an exit path ( TRUE ) or not ( FALSE )
00000000  2              5) SET_CODE, a return code describing how it went:
00000000  2                  -6 indicates function overflow
00000000  2                  -4 indicates out of high level hardware resources
00000000  2                  -3 indicates out of low level hardware resources
00000000  2                   0 indicates no error:  all assignments completed
00000000  2                                                                      *)
00000000  2   VAR
00000000  2
00000000  2     OP_VALUE:  L_INT; (* Processor value for opcode fetch *)
00000004  2
00000004  2     OP_MASK:  L_INT; (* Processor mask for opcode fetch *)
00000008  2
00000008  2     ADDR_MASK:  L_INT; (* Processor mask for address bus *)
0000000C  2
0000000C  2     RSRC_VALUE:  L_INT; (* Value to load resource with *)
00000010  2
00000010  2     RSRC_MASK:  L_INT; (* Mask to load resource with *)
00000014  2
00000014  2     NEXT_LL:  S_INT; (* Next assigned low level resource *)
00000004  2
00000004  2   BEGIN (* Procedure SET_TD_PATHS *)
00000004  2     SET_CODE := NO_ERROR; (* It should work *)
0000000A  2
0000000A  2     (* Get processor specific values/masks *)
0000000A  2
0000000A  2     GET_VALUE_MASK ( OPCODE, OP_VALUE, OP_MASK );
00000022  2     ADDR_MASK := GET_BUS_MASK ( 0 );
00000030  2     RSRC_MASK := OP_MASK + ADDR_MASK;
0000003C  2
0000003C  2     (* Turn on opcode resource if necessary *)
0000003C  2
0000003C  2     IF ID = 0
00000044  2       THEN (* First time through:  turn it on *)
00000044  2         NEXT_LL := ASSIGN_LL_RSRC ( OPCODE_EQUATE, 999, OP_VALUE+
00000044  2                                     ADDR_MASK, OP_MASK, 0, 0,
00000044  2                                     SPEC.LOW_LEVELS );
00000074  2
00000074  2     (* Get resource to watch procedure entry *)
00000074  2
00000074  2     IF NEED_ENTRY = TRUE
00000082  2       THEN (* Need to add an entry path *)
00000082  2         BEGIN (* Add entry path *)
00000082  2           (* Logical --> physical *)
00000082  2           P_ADDR ( PROC_REC.ENTRY, RSRC_VALUE );
00000096  2           RSRC_VALUE := RSRC_VALUE + OP_VALUE;
0000009E  2           ADD_PATH ( ADDRESS_EQUATE, ID*3, RSRC_VALUE, RSRC_MASK,
```

```
0000009E  2                    0, 0, HIGHS, SPEC.LOW_LEVELS, SPEC.HIGH_LEVELS,
0000009E  2                    IO, SET_CODE );
000000E4  2              IF SET_CODE = NO_ERROR
000000EE  2                THEN (* Have entry path *)
000000EE  2                  NEED_ENTRY := FALSE
000000F4  2            END; (* Add entry path *)
000000F4  2
000000F4  2        (* Get another resource to watch procedure pseudo exit *)
000000F4  2
000000F4  2        IF ( NEED_EXIT = TRUE ) AND ( SET_CODE = NO_ERROR )
00000116  2          THEN (* Procedure entry path created *)
00000116  2            BEGIN (* Add pseudo exit path *)
00000116  2              (* Logical --> physical *)
00000116  2              P_ADDR ( PROC_REC.EXIT-PROC_REC.EXIT_OFFSET, RSRC_VALUE );
00000134  2              RSRC_VALUE := RSRC_VALUE + OP_VALUE;
0000013C  2              ADD_PATH ( ADDRESS_EQUATE, (ID*3)+1, RSRC_VALUE, RSRC_MASK,
0000013C  2                         0, 0, HIGHS, SPEC.LOW_LEVELS, SPEC.HIGH_LEVELS,
0000013C  2                         IO, SET_CODE );
00000184  2              IF SET_CODE = NO_ERROR
0000018E  2                THEN (* Have pseudo exit path *)
0000018E  2                  NEED_EXIT := FALSE
00000194  2            END; (* Add pseudo exit path *)
00000194  2
00000194  2        (* Get another resource to watch in the middle *)
00000194  2
00000194  2        (* Call GET_DEPTH to get queue depth *)
00000194  2        RSRC_VALUE := PROC_REC.EXIT - PROC_REC.EXIT_OFFSET - GET_DEPTH;
000001B8  2        IF ( SET_CODE = NO_ERROR ) AND
000001C8  2           ( RSRC_VALUE > PROC_REC.ENTRY + PROC_REC.ENTRY_OFFSET )
000001E0  2          THEN (* Can create path in the middle *)
000001E0  2            BEGIN (* Add middle path *)
000001E0  2              (* Logical --> physical *)
000001E0  2              P_ADDR ( RSRC_VALUE, RSRC_VALUE );
000001EE  2              RSRC_VALUE := RSRC_VALUE + OP_VALUE;
000001F6  2              ADD_PATH ( ADDRESS_EQUATE, (ID*3)+2, RSRC_VALUE, RSRC_MASK,
000001F6  2                         0, 0, HIGHS, SPEC.LOW_LEVELS, SPEC.HIGH_LEVELS,
000001F6  2                         IO, SET_CODE )
0000023E  2            END (* Add middle path *)
0000023E  2  END; (* Procedure SET_TD_PATHS *)
00000000  1  $GLOBPROC OFF$
00000000  1
00000000  1
00000000  1
00000000  1
00000000  1
00000000  1  (*
00000000  1
00000000  1                       **************************
00000000  1                       ***** RESET_TD_RSRC *****
00000000  1                       **************************
00000000  1
                                                                              *)
00000000  1  $GLOBPROC ON$
00000000  1  PROCEDURE RESET_TD_RSRC ( ENTRY_ON:  BOOLEAN; ID:  S_INT; VAR PROC_REC:
00000000  2                           CMD_DATA_TYPE; VAR SPEC:  HW_SPEC_REC );
00000000  2  (*
00000000  2    Procedure RESET_TD_RSRC to reset the entry resource in trace data
00000000  2    flow.  Depending upon ENTRY_ON, the resource is either set to the
00000000  2    entry or the pseudo entry.
00000000  2
00000000  2    RESET_TD_RSRC uses the following routines:  CHANGE_LL_RSRC,
00000000  2    GET_VALUE_MASK, GET_BUS_MASK, and P_ADDR.
00000000  2
00000000  2    Input:  1) ENTRY_ON, a flag indicating if the resource is to be
00000000  2               set to entry ( TRUE ) or pseudo entry ( FALSE )
00000000  2            2) ID, the basis for the resource I.D.s assigned to the
00000000  2               original paths
00000000  2            3) PROC_REC, the record describing the procedure being traced
00000000  2            4) SPEC, the hardware specification
00000000  2    Output:  1) SPEC, the updated hardware specification
00000000  2
                                                                              *)
00000000  2  VAR
00000000  2
00000000  2    OP_VALUE:  L_INT; (* Processor value for opcode fetch *)
```

```
00000004  2
00000004  2    OP_MASK:  L_INT; (* Processor mask for opcode fetch *)
00000008  2
00000008  2    RSRC_VALUE:  L_INT; (* Value to load resource with *)
0000000C  2
0000000C  2    RSRC_MASK:  L_INT; (* Mask to load resource with *)
00000246  2
00000246  2  BEGIN (* Procedure RESET_TD_RSRC *)
00000246  2    (* Get processor specific values/masks *)
00000246  2    GET_VALUE_MASK ( OPCODE, OP_VALUE, OP_MASK );
0000025E  2    (* Logical --> physical *)
0000025E  2    P_ADDR ( PROC_REC.ENTRY, RSRC_VALUE );
00000272  2    RSRC_VALUE := RSRC_VALUE + OP_VALUE;
0000027A  2    RSRC_MASK := OP_MASK + GET_BUS_MASK ( 0 );
0000029E  2
0000028E  2    IF ENTRY_ON = FALSE
0000029A  2      THEN (* Want pseudo entry *)
0000029A  2        (* Set up pseudo entry *)
0000029A  2        RSRC_VALUE := RSRC_VALUE + PROC_REC.ENTRY_OFFSET;
000002B8  2
000002A8  2    (* Reset the resource *)
000002A8  2    CHANGE_LL_RSRC ( ID*3, RSRC_VALUE, RSRC_MASK, 0, 0, SPEC.LOW_LEVELS );
000002D0  2    SPEC.RSRC_DIRTY := TRUE
000002DA  2  END; (* Procedure RESET_TD_RSRC *)
00000000  1  $GLOBPROC OFF$
00000000  1
00000000  1
00000000  1
00000000  1
00000000  1
00000000  1  (*
00000000  1                          ***************************
00000000  1                          ***** TOGGLE_TD_RSRC *****
00000000  1                          ***************************
00000000  1                                                                  *)
00000000  1  $GLOBPROC ON$
00000000  1  PROCEDURE TOGGLE_TD_RSRC ( TURN_ON:  BOOLEAN; ID:  S_INT; VAR PROC_REC:
00000000  2                              CMD_DATA_TYPE; VAR SPEC:  HW_SPEC_REC );
00000000  2  (*
00000000  2    Procedure TOGGLE_TD_RSRC to toggle the middle resource in trace
00000000  2    data flow.  Depending upon TURN_ON, the resource is either enabled
00000000  2    or disabled.
00000000  2
00000000  2    TOGGLE_TD_RSRC uses the following routines:  CHANGE_LL_RSRC,
00000000  2    GET_VALUE_MASK, GET_BUS_MASK, GET_DEPTH, and P_ADDR.
00000000  2
00000000  2    Input:  1) TURN_ON, a flag indicating if the resource is to be
00000000  2               enabled ( TRUE ) or disabled ( FALSE )
00000000  2            2) ID, the basis for the resource I.D.s assigned to the
00000000  2               original paths
00000000  2            3) PROC_REC, the record describing the procedure being traced
00000000  2            4) SPEC, the hardware specification
00000000  2    Output:  1) SPEC, the updated hardware specification
00000000  2                                                                  *)
00000000  2  VAR
00000000  2
00000000  2    OP_VALUE:  L_INT; (* Processor value for opcode fetch *)
00000004  2
00000004  2    OP_MASK:  L_INT; (* Processor mask for opcode fetch *)
00000008  2
00000008  2    RSRC_VALUE:  L_INT; (* Value to load resource with *)
0000000C  2
0000000C  2    RSRC_MASK:  L_INT; (* Mask to load resource with *)
000002E2  2
000002E2  2  BEGIN (* Procedure TOGGLE_TD_RSRC *)
000002E2  2    IF TURN_ON = TRUE
000002EE  2      THEN (* Want to enable resource *)
000002EE  2        BEGIN (* Enable it *)
000002EE  2          (* Get processor specific values/masks *)
000002EE  2          GET_VALUE_MASK ( OPCODE, OP_VALUE, OP_MASK );
00000306  2          (* Call GET_DEPTH for queue depth *)
00000306  2          RSRC_VALUE := PROC_REC.EXIT - PROC_REC.EXIT_OFFSET - GET_DEPTH;
0000032A  2          (* Logical --> physical *)
0000032A  2          P_ADDR ( RSRC_VALUE, RSRC_VALUE );
```

```
00000328  2        RSRC_VALUE := RSRC_VALUE + OP_VALUE;
00000340  2        RSRC_MASK := OP_MASK + GET_BUS_MASK ( 0 )
00000354  2      END (* Enable it *)
00000358  2    ELSE (* Want to disable resource *)
00000358  2      BEGIN (* Disable it *)
00000358  2        RSRC_VALUE := 0;
0000035C  2        RSRC_MASK := 0
00000360  2      END; (* Disable it *)
00000360  2
00000360  2   (* Toggle the resource *)
00000360  2   CHANGE_LL_RSRC ( (ID*3)+2, RSRC_VALUE, RSRC_MASK, 0, 0,
00000360  2                    SPEC.LOW_LEVELS );
0000038A  2   SPEC.RSRC_DIRTY := TRUE
00000394  2 END; (* Procedure TOGGLE_TD_RSRC *)
00000000  1 $GLOBPROC OFF$
00000000  1
00000000  1
00000000  1
00000000  1
00000000  1
00000000  1 (*
00000000  1                       ************************
00000000  1                       ***** GET_TD_VARS *****
00000000  1                       ************************
00000000  1                                                                  *)
00000000  1 $GLOBPROC ON$
00000000  1 PROCEDURE GET_TD_VARS ( VAR MEAS:  CMD_DATA_ARRAY; VAR SYMS:
00000000  2                         SYM_DESCRIPS; P_INDEX, P_DATA:  S_INT; VAR
00000000  2                         FRAME:  FRAME_REC_TYPE; PROG_COUNTER:  L_INT;
00000000  2                         VAR UN_COUNT, GET_CODE:  S_INT );
00000000  2 (*
00000000  2   Procedure GET_TD_VARS to unload all variables associated with the
00000000  2   procedure whose index, P_INDEX, to the measurement structure is
00000000  2   given.  Procedure gets variables and their offsets off the
00000000  2   measurement stack and unloads them from emulation memory, one at
00000000  2   a time, until it runs out of variables for the given procedure.
00000000  2
00000000  2   GET_TD_VARS uses the following routines:  FIND_STATIC, FIND_DYNAMIC,
00000000  2   FIND_INDEX, TEST_BITS, UNLOAD_DONE, P_ADDR, and UNLOAD_VARIABLE.
00000000  2
00000000  2   Input:  1) MEAS, the description of the measurement
00000000  2           2) SYMS, the list of all symbols involved in the measurement
00000000  2           3) P_INDEX, the index into MEAS of the procedure record
00000000  2           4) P_DATA, a value indicating if the break was on entry
00000000  2              or exit:  4 indicates entry, 5 indicates exit
00000000  2           5) FRAME, the frame record for the given procedure
00000000  2           6) PROG_COUNTER, the program counter to be associated with
00000000  2              these variables
00000000  2           7) UN_COUNT, the number of records unloaded so far
00000000  2   Output:  1) UN_COUNT, the updated number of records unloaded
00000000  2            2) GET_CODE, a code telling how it all turned out:
00000000  2               -26 indicates emulation error
00000000  2               -19 indicates variable not active ( should never happen )
00000000  2                -2 indicates measurement structure is corrupt
00000000  2                 0 indicates no error:  all variables unloaded to
00000000  2                   trace file
00000000  2                 3 indicates file not found:  invalid DCB ( should never
00000000  2                   happen )
00000000  2                 5 indicates no free pages available
00000000  2                 7 indicates file corrupt
00000000  2                                                                  *)
00000000  2 VAR
00000000  2
00000000  2   I:  S_INT; (* WHILE loop index *)
00000002  2
00000002  2   S_INDEX:  S_INT; (* Index of symbol in symbol table *)
00000004  2
00000004  2   P_ADDRESS:  L_INT; (* Physical address of static variable *)
00000008  2
00000008  2   DONE_SET:  SYM_INDEX_SET; (* Set of already unloaded symbols:  their
0000039C  2                              indeces *),
0000039C  2
0000039C  2 BEGIN (* Procedure GET_TD_VARS *)
0000039C  2   GET_CODE := NO_ERROR;
000003A2  2   DONE_SET := []; (* Haven't done anything yet *)
000003A6  2   I := P_INDEX + 1;
```

```
000003B0  2    WHILE ( MEAS [ I ].OP_CODE = VAR_OP ) AND ( GET_CODE = NO_ERROR ) AND
000003B0  2         ( UNLOAD_DONE ( UN_COUNT ) = FALSE ) DO
000003FE  2      BEGIN (* Unload all requested variables *)
000003FE  2        WITH MEAS [ I ] DO
00000412  2          IF ( P_DATA = PROC_EXIT ) AND ( TEST_BITS ( 16, FLAGS ) =
00000412  2             FALSE ) AND ( TEST_BITS ( 8, FLAGS ) = TRUE ) AND
00000412  2             ( MEAS [ P_INDEX ].PROC_NUM = PROC_NUM )
00000498  2            THEN (* This is on exit and a pass by value parameter and
00000498  2                   dynamic and located in this procedure *)
00000498  2              S_INDEX := -1 (* Don't unload it *)
000004A2  2            ELSE (* This is an entry or a pass by reference parameter or
000004A2  2                   is not located in this procedure *)
000004A2  2              IF SIZE = -1
000004B4  2                THEN (* This is a pointer *)
000004B4  2                  S_INDEX := FIND_INDEX ( SYMS, I )
000004CE  2                ELSE (* This is not a pointer *)
000004CE  2                  IF TEST_BITS ( 8, FLAGS ) = FALSE
000004F0  2                    THEN (* Static variable *)
000004F0  2                      BEGIN (* Find static *)
000004F0  2                        P_ADDR ( ADDRESS, P_ADDRESS ); (* Logical -->
00000504  2                                                          physical *)
00000504  2                        S_INDEX := FIND_STATIC ( MEAS, SYMS, P_ADDRESS )
00000524  2                      END (* Find static *)
00000528  2                    ELSE (* Dynamic variable *)
00000528  2                      S_INDEX := FIND_DYNAMIC ( MEAS, SYMS, ADDRESS,
00000528  2                                                FILE_NUM, PROC_NUM );
00000554  2        IF ( S_INDEX <> -1 ) AND NOT ( NUM_SYMS ( S_INDEX ) IN DONE_SET )
0000058E  2          THEN (* Found the symbol and haven't got it yet *)
0000058E  2            BEGIN (* Unload the symbol *)
0000058E  2              UNLOAD_VARIABLE ( MEAS [ P_INDEX ], MEAS [ I ],
0000058E  2                                MEAS [ I+1 ], FRAME, S_INDEX,
0000058E  2                                PROG_COUNTER, UN_COUNT, GET_CODE );
000005DC  2              (* Remember I've done this one *)
000005DC  2              DONE_SET := DONE_SET + [ NUM_SYMS ( S_INDEX ) ]
000005EE  2            END; (* Unload the symbol *)
000005EE  2        IF MEAS [ I+1 ].OP_CODE = OFFSET
00000608  2          THEN (* There was an offset array *)
00000608  2            I := I + 2
00000610  2          ELSE (* No offset array *)
00000610  2            I := I + 1
00000614  2      END (* Unload all requested variables *)
00000618  2  END; (* Procedure GET_TD_VARS *)
00000000  1  $GLOBPROC OFF$
00000000  1  .

508: Warning: field or entry alignment; record or array comparisons may not work

End of compilation, number of errors=    0

00000000  1  "68000" PREPROCESS
00000000  1  $EXTENSIONS ON$
00000000  1  $LIB_ABS_LONG$
00000000  1  $TITLE "Soda Dynamic Controller:  Time Modules"
00000000  1  PROGRAM TIME_MODS;
00000000  1  (*
00000000  1  ***************************** TIME_MODS *****************************
00000000  1    TIME_MODS is the module containing the routines for the load pre-
00000000  1    processor and the unload post-processor for the time modules
00000000  1    measurement.  For pre-processing, the user measurement data structure
00000000  1    is translated to reflect a time modules measurement.  For post-
00000000  1    processing, the measurement data is unloaded from the hardware,  all
00000000  1    garbage is removed, and the current trace file is updated with all
00000000  1    valid measurement data.
00000000  1    Author:  Kip Fulghum
00000000  1    Date:  10-10-83  Revised:  1-9-85
00000000  1  ************************************************************************
00000000  1
00000000  1    TIME_MODS contains the following routines:
00000000  1    -Global procedure LOAD_DM is the pre-processor for the time modules
00000000  1     measurement.  It loads the appropriate data structures with the
00000000  1     necessary information to create a time modules measurement when
00000000  1     loaded into the hardware.
00000000  1    -Global procedure UNLOAD_DM is the post-processor for the trace
00000000  1     modules measurement.  It unloads the hardware one sextuplet at
```

```
00000000 1     a time, classifies the data, accumulates the timing information, and
00000000 1     creates valid trace file data records.
00000000 1
00000000 1    In addition, TIME_MODS uses the following external routines:
00000000 1    LOAD_TM,
00000000 1    HOW_MUCH_DATA, GET_DATA, FIND_STATIC, UNLOAD_MSG, UNLOAD_DONE,
00000000 1    PUSH_TIME, POP_TIME,
00000000 1    CLASS_PROC_DATA,
00000000 1    INIT_DM_TIMES, UPDATE_DM_TIMES, and UNLOAD_DM_TIMES.
00000000 1                                                                    *)
00000000 1  (*
00000000 1                        *************************
00000000 1                        ***** Include Files *****
00000000 1                        *************************
00000000 1                                                                    *)
00000000 1
00000000 1  #INCLUDE ER_CONST:SS_DYN
00000000 1
00000000 1  #INCLUDE COM_TYPES:SS_DYN
00000000 1
00000000 1  #INCLUDE LD_TYPES:SS_DYN
00000000 1
00000000 1  #INCLUDE UNLD_TYPES:SS_DYN
00000000 1
00000000 1  #INCLUDE ICMD_DATA:SODAMON
00000000 1
00000000 1  VAR
00000000 1
00000000 1    TIME_ARRAY:  TIME_ARRAY_TYPE; (* Array of pointers to module times *)
00000028 1
00000028 1
00000028 1
00000028 1
00000028 1
00000028 1  $CALL_ABS_LONG$
00000000 1  (*
00000000 1                          *******************
00000000 1                          ***** LOAD_TM *****
00000000 1                          *******************
00000000 1                                                                    *)
00000000 1  PROCEDURE LOAD_TM ( VAR MEAS_:  CMD_DATA_ARRAY; VAR SYMS_:
00000000 2                      SYM_DESCRIPS; VAR SPEC_:  HW_SPEC_REC; VAR R_CODE:
00000000 2                      S_INT );EXTERNAL;
00000000 1  (*
00000000 1    Procedure LOAD_TM is the pre-processor for the trace modules
00000000 1    measurement.  It loads the appropriate hardware data structures with
00000000 1    the necessary information to create a trace modules measurement when
00000000 1    loaded into the hardware.  Provided as a Pascal external.
00000000 1                                                                    *)
00000000 1
00000000 1
00000000 1
00000000 1
00000000 1
00000000 1  (*
00000000 1                        *************************
00000000 1                        ***** HOW_MUCH_DATA *****
00000000 1                        *************************
00000000 1                                                                    *)
00000000 1  PROCEDURE HOW_MUCH_DATA ( VAR FLAGS:  FLAG_ARRAY_TYPE; VAR FEAT_ARRAY:
00000000 2                            FEAT_ARRAY_TYPE; START_MAC, END_MAC:  S_INT,
00000000 2                            VAR START_STATE, NUM_STATES:  S_INT );
00000000 2                            EXTERNAL;
00000000 1  (*
00000000 1    Procedure HOW_MUCH_DATA to determine how much data was captured and
00000000 1    starting from where.  Provided as a Pascal external.
00000000 1                                                                    *)
00000000 1
00000000 1
00000000 1
00000000 1
00000000 1
00000000 1  (*
00000000 1                          *******************
```

```
00000000  1                               ***** GET_DATA *****
00000000  1                               ********************
00000000  1                                                                      *)
00000000  1  PROCEDURE GET_DATA ( START_STATE, UN_COUNTER:  S_INT; VAR FEAT_ARRAY:
00000000  2                       FEAT_ARRAY_TYPE; VAR BASE:  DOUBLE_ARRAY; VAR
00000000  2                       SEXTET:  SEXTET_REC_TYPE ); EXTERNAL;
00000000  1  (*
00000000  1    Procedure GET_DATA to retrieve a sextet worth of data out of
00000000  1    acquisition memory, translate the emulation data to generic data,
00000000  1    and decode the captured grey-code count.  Provided as a Pascal
00000000  1    external.
00000000  1                                                                      *)
00000000  1
00000000  1
00000000  1
00000000  1
00000000  1
00000000  1  (*
00000000  1                              ************************
00000000  1                              ***** FIND_STATIC *****
00000000  1                              ************************
00000000  1                                                                      *)
00000000  1  FUNCTION FIND_STATIC ( VAR MEAS_STRUCT:  CMD_DATA_ARRAY; VAR
00000000  2                         SYM_STRUCT:  SYM_DESCRIPS; EMUL_ADRS:  L_INT ):
00000000  2                         S_INT; EXTERNAL;
00000000  1  (*
00000000  1    Function FIND_STATIC returns the index of the record in the
00000000  1    symbol table structure related to the given static data.  Provided
00000000  1    as a Pascal external.
00000000  1                                                                      *)
00000000  1
00000000  1
00000000  1
00000000  1
00000000  1
00000000  1  (*
00000000  1                              ************************
00000000  1                              ***** UNLOAD_MSG *****
00000000  1                              ************************
00000000  1                                                                      *)
00000000  1  PROCEDURE UNLOAD_MSG ( STATE:  S_INT ); EXTERNAL;
00000000  1  (*
00000000  1    Procedure UNLOAD_MSG to update the current unload message with the
00000000  1    given count.  Provided as a Pascal external.
00000000  1                                                                      *)
00000000  1
00000000  1
00000000  1
00000000  1
00000000  1
00000000  1  (*
00000000  1                              ************************
00000000  1                              ***** UNLOAD_DONE *****
00000000  1                              ************************
00000000  1                                                                      *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                                      *)
00000000  1
00000000  1
00000000  1
00000000  1
00000000  1
00000000  1  (*
00000000  1                              *********************
00000000  1                              ***** PUSH_TIME *****
00000000  1                              *********************
00000000  1                                                                      *)
00000000  1  PROCEDURE PUSH_TIME ( ENTRY:  DOUBLE_ARRAY; VAR STACK:  TSTACK_TYPE;
00000000  2                        VAR TOP:  TSTACK_INDEX; VAR CODE:
00000000  2                        TSTACK_RETCODE ); EXTERNAL;
00000000  1  (*
```

```
00000000  1    Procedure PUSH_TIME to push the given time onto the given stack.
00000000  1    Provided as a Pascal external.
00000000  1                                                                   *)
00000000  1
00000000  1
00000000  1
00000000  1
00000000  1
00000000  1  (*
00000000  1                         ********************
00000000  1                         ***** POP_TIME *****
00000000  1                         ********************
00000000  1                                                                   *)
00000000  1  PROCEDURE POP_TIME ( VAR STACK:  TSTACK_TYPE; VAR TOP:  TSTACK_INDEX;
00000000  2                       VAR ENTRY:  DOUBLE_ARRAY; VAR CODE:
00000000  2                       TSTACK_RETCODE ); EXTERNAL;
00000000  1  (*
00000000  1    Procedure POP_TIME to pop the next time off the given stack.
00000000  1    Provided as a Pascal external.
00000000  1                                                                   *)
00000000  1
00000000  1
00000000  1
00000000  1
00000000  1
00000000  1  (*
00000000  1                       *****************************
00000000  1                       ***** CLASS_PROC_DATA *****
00000000  1                       *****************************
00000000  1                                                                   *)
00000000  1  FUNCTION CLASS_PROC_DATA ( VAR PROC_REC:  CMD_DATA_TYPE; ADRS, PREV_PC,
00000000  2                             NEXT_PC:  L_INT ):  S_INT; EXTERNAL;
00000028  1  (*
00000028  1    Function CLASS_PROC_DATA to determine what type of procedural data
00000028  1    was captured.  Provided as a Pascal external.
00000028  1                                                                   *)
00000028  1
00000028  1
00000028  1
00000028  1
00000028  1
00000028  1  $CALL_PC_SHORTS$
00000000  1  (*
00000000  1                       ***************************
00000000  1                       ***** INIT_DM_TIMES *****
00000000  1                       ***************************
00000000  1                                                                   *)
00000000  1  PROCEDURE INIT_DM_TIMES ( NUM:  S_INT; VAR TIME_STRUCT:
00000000  2                            TIME_ARRAY_TYPE ); EXTERNAL;
00000000  1  (*
00000000  1    Procedure INIT_DM_TIMES to initialize all entries in the time array.
00000000  1    Provided as a Pascal external.
00000000  1                                                                   *)
00000000  1
00000000  1
00000000  1
00000000  1
00000000  1
00000000  1  (*
00000000  1                       *****************************
00000000  1                       ***** UPDATE_DM_TIMES *****
00000000  1                       *****************************
00000000  1
00000000  1  PROCEDURE UPDATE_DM_TIMES ( VAR ENTRY_TIME, EXIT_TIME:  DOUBLE_ARRAY;
00000000  2                              VAR TIME_REC:  TIME_REC_TYPE ); EXTERNAL;
00000000  1  (*
00000000  1
00000000  1    Procedure UPDATE_DM_TIMES to update the given procedure's time record
00000000  1    with the given times.  Provided as a Pascal external.
00000000  1                                                                   *)
00000000  1
00000000  1
00000000  1
00000000  1
00000000  1
```

```
00000000  1  (*
00000000  1                    ******************************
00000000  1                    ***** UNLOAD_DM_TIMES *****
00000000  1                    ******************************
00000000  1                                                                  *)
00000000  1  PROCEDURE UNLOAD_DM_TIMES ( NUM:  S_INT; VAR TIME_STRUCT:
00000000  2                           TIME_ARRAY_TYPE, VAR UN_COUNT, TM_CODE:
00000000  2                           S_INT ); EXTERNAL;
00000028  1  (*
00000028  1    Procedure UNLOAD_DM_TIMES to unload the gathered time information
00000028  1    to the trace file.  Provided as a Pascal external.
00000028  1                                                                  *)
00000028  1
00000028  1
00000028  1
00000028  1
00000028  1
00000028  1  (*
00000028  1                       ********************
00000028  1                       ***** LOAD_DM *****
00000028  1                       ********************
00000028  1                                                                  *)
00000028  1  $GLOBPROC ON$
00000000  1  PROCEDURE LOAD_DM ( VAR MEAS_:  CMD_DATA_ARRAY; VAR SYMS_:
00000000  2                    SYM_DESCRIPS; VAR SPEC_:  HW_SPEC_REC; VAR R_CODE:
00000000  2                    S_INT );
00000004  2  (*
00000004  2    Procedure LOAD_DM is the pre-processor for the time modules
00000004  2    measurement.  Currently, it calls LOAD_TM because the same state
00000004  2    machine accomplishes both measurements.
00000004  2
00000004  2    LOAD_DM uses the following routine:  LOAD_TM.
00000004  2
00000004  2    Input:  1) MEAS_, the input structure to the loader indicating
00000004  2               what the measurement is
00000004  2            2) SYMS_, a list of all unique symbols involved in the
00000004  2               measurement ( ie procedures )
00000004  2            3) SPEC_, the initialized hardware specification structure
00000004  2    Output:  1) SPEC_, the completed hardware record containing
00000004  2                specifications for usage of the:
00000004  2               a) low level resources,
00000004  2               b) high level resources,
00000004  2               c) fast sequencer,
00000004  2               d) micro-code occurance counters,
00000004  2               e) function generators,
00000004  2               f) misc. signals,
00000004  2               g) occurance counters,
00000004  2               h) extraneous features
00000004  2             2) R_CODE, a code specifying how the load turned out:
00000004  2                 -6 indicates translation error:  function description
00000004  2                    overflow
00000004  2                 -4 indicates out of high level hardware resources
00000004  2                 -3 indicates out of low level hardware resources
00000004  2                  0 indicates no error:  load completed
00000004  2                                                                  *)
00000004  2  BEGIN (* Procedure LOAD_DM *)
00000004  2    (* Load up a time modules measurement *)
00000004  2    LOAD_TM ( MEAS_, SYMS_, SPEC_, R_CODE )
00000028  2  END; (* Procedure LOAD_DM *)
00000000  1  $GLOBPROC OFF$
00000000  1
00000000  1
00000000  1
00000000  1
00000000  1
00000000  1  (*
00000000  1                       **********************
00000000  1                       ***** UNLOAD_DM *****
00000000  1                       **********************
00000000  1                                                                  *)
00000000  1  $GLOBPROC ON$
00000000  1  PROCEDURE UNLOAD_DM ( VAR MEAS_:  CMD_DATA_ARRAY; VAR SYMS_:
00000000  2                      SYM_DESCRIPS; VAR FLAGS_:  FLAG_ARRAY_TYPE; MAC_:
00000000  2                      S_INT; VAR SPEC_:  HW_SPEC_REC; VAR UNLD_COUNT,
00000000  2                      R_CODE:  S_INT );
00000000  2  (*
```

```
00000000  2      Procedure UNLOAD_DM is the post-processor for the time modules
00000000  2      measurement.  It unloads the hardware one sextuplet at a time,
00000000  2      classifies the data, accumulates the timing information, and creates
00000000  2      valid trace file data records.
00000000  2
00000000  2      UNLOAD_DM uses the following routines:  HOW_MUCH_DATA, GET_DATA,
00000000  2      FIND_STATIC, UNLOAD_MSG, UNLOAD_DONE, PUSH_TIME, POP_TIME,
00000000  2      CLASS_PROC_DATA, INIT_DM_TIMES, UPDATE_DM_TIMES, and UNLOAD_DM_TIMES.
00000000  2
00000000  2      Input:  1) MEAS_, the structure describing the measurement at a high
00000000  2                 level
00000000  2              2) SYMS_, a list of all unique symbols involved in the
00000000  2                 measurement ( ie procedures )
00000000  2              3) FLAGS_, the flag word data structure containing the
00000000  2                 most recently read hardware flags
00000000  2              4) MAC_, the memory address counter off the memory board
00000000  2                 obtained before unloading began
00000000  2              5) SPEC_, the hardware specification which captured the
00000000  2                 data
00000000  2              6) UNLD_COUNT, the previous # of states unloaded and
00000000  2                 shipped out to the trace file
00000000  2      Output:  1) SPEC_, the possibly modified hardware specification
00000000  2                  structure
00000000  2               2) UNLD_COUNT, the updated # of states unloaded and output
00000000  2                  to the trace file
00000000  2               3) R_CODE, the return code indicating how things turned out:
00000000  2                    0 indicates no error:  data records completed
00000000  2                    1 indicates end of file ( should never happen )
00000000  2                    2 indicates invalid disc ( should never happen )
00000000  2                    3 indicates file not found:  invalid DCB ( should never
00000000  2                      happen )
00000000  2                    5 indicates no free pages available
00000000  2                    7 indicates file corrupt
00000000  2                                                                        *)
00000000  2  VAR
00000000  2
00000000  2    START_LOCATION:  S_INT; (* First location to unload *)
00000002  2
00000002  2    NUM_LOCATIONS:  S_INT; (* Number of locations to unload *)
00000004  2
00000004  2    MEM_COUNT:  S_INT; (* Memory unload count *)
00000006  2
00000006  2    CURRENT_BASE:  DOUBLE_ARRAY; (* Storage for current base count *)
0000000E  2
0000000E  2    SEXTET_REC:  SEXTET_REC_TYPE; (* Storage for unloaded hw sextet *)
00000024  2
00000024  2    SYMBOL_INDEX:  S_INT, (* Index into symbol table to symbol info
00000026  2                            for hardware sextet *)
00000026  2
00000026  2    CUR_TYPE:  S_INT; (* Type of data in hardware sextet *)
00000028  2
00000028  2    ENTRY_TIME:  DOUBLE_ARRAY; (* Entry time into module *)
00000030  2
00000030  2    TIME_STACK_PTR:  TSTACK_PTR_TYPE; (* Pointer to time stack *)
00000034  2
00000034  2    TIME_INDEX:  S_INT; (* Index into time stack *)
00000036  2
00000036  2    TIME_OFC:  L_INT; (* Stack overflow counter *)
0000003A  2
0000003A  2    STACK_CODE:  TSTACK_RETCODE; (* Return code from stack operations *)
0000003C  2
0000003C  2  BEGIN (* Procedure UNLOAD_DM *)
0000003C  2    R_CODE := NO_ERROR; (* Be optimistic *)
00000036  2
00000036  2    (* Initialize time stuff *)
00000036  2
00000036  2    NEW ( TIME_STACK_PTR );
00000048  2    TIME_INDEX := -1;
0000004E  2    TIME_OFC := 0;
00000052  2    (* Initialize the time array *)
00000052  2    INIT_DM_TIMES ( SYMS_.SYMBOL_COUNT, TIME_ARRAY );
00000062  2
00000062  2    (* Figure out how much to unload *)
00000062  2
00000062  2    HOW_MUCH_DATA ( FLAGS_, SPEC_.FEATURES, SPEC_.START_MAC, MAC_,
```

```
00000062  2                 START_LOCATION, NUM_LOCATIONS );
0000008C  2
0000008C  2   (* Now, unload it all *)
0000008C  2
0000008C  2   MEM_COUNT := 1;
00000092  2   WHILE ( MEM_COUNT <= NUM_LOCATIONS ) AND
00000092  2         ( UNLOAD_DONE ( UNLD_COUNT ) = FALSE ) DO
000000BE  2     BEGIN (* Unload a sextet *)
000000BE  2       UNLOAD_MSG ( MEM_COUNT );
000000C8  2
000000C8  2       (* Pull a sextet out of the hardware *)
000000C8  2
000000C8  2       GET_DATA ( START_LOCATION, MEM_COUNT, SPEC_.FEATURES,
000000C8  2                  CURRENT_BASE, SEXTET_REC );
000000EC  2
000000EC  2       (* Map data to a symbol *)
000000EC  2
000000EC  2       SYMBOL_INDEX := FIND_STATIC ( MEAS_, SYMS_, SEXTET_REC.ADRS );
0000010C  2       IF SYMBOL_INDEX <> -1
00000118  2         THEN (* Data maps to a procedure *)
00000118  2           (* See what we got:  entry or exit *)
00000118  2           CUR_TYPE := CLASS_PROC_DATA ( MEAS_ [ SYMS_.SYMBOL_ARRAY
00000118  2                       [ SYMBOL_INDEX ].DESCRIP_INDEX ],
00000118  2                       SEXTET_REC.ADRS, SEXTET_REC.PC, -1 )
00000156  2         ELSE (* No matching symbol *)
00000156  2           CUR_TYPE := GARBAGE;
0000015C  2
0000015C  2       (* Do something about entry data *)
0000015C  2
0000015C  2       IF CUR_TYPE = PROC_ENTRY
00000168  2         THEN (* This is an entry point *)
00000168  2           BEGIN (* Push entry time onto stack *)
00000168  2             PUSH_TIME ( SEXTET_REC.COUNT, TIME_STACK_PTR^, TIME_INDEX,
00000168  2                         STACK_CODE );
00000186  2             IF STACK_CODE = -1
00000192  2               THEN (* Overflow *)
00000192  2                 TIME_OFC := TIME_OFC + 1
00000196  2           END; (* Push entry time onto stack *)
00000196  2
00000196  2       (* Do something about exit data *)
00000196  2
00000196  2       IF CUR_TYPE = PROC_EXIT
000001A2  2         THEN (* This is an exit point *)
000001A2  2           IF TIME_OFC <> 0
000001AA  2             THEN (* We overflowed earlier *)
000001AA  2               TIME_OFC := TIME_OFC - 1
000001B2  2             ELSE (* Everything is fine *)
000001B2  2               BEGIN (* Pop entry time off stack *)
000001B2  2                 POP_TIME ( TIME_STACK_PTR^, TIME_INDEX, ENTRY_TIME,
000001B2  2                            STACK_CODE );
000001D0  2                 IF STACK_CODE = 1
000001DC  2                   THEN (* We have seen a matching entry point *)
000001DC  2                     UPDATE_DM_TIMES ( ENTRY_TIME, SEXTET_REC.COUNT,
000001DC  2                                       TIME_ARRAY [ SYMBOL_INDEX ]^ )
000001FE  2               END; (* Pop entry time off stack *)
000001FE  2       MEM_COUNT := MEM_COUNT + 1
00000202  2     END; (* Unload a sextet *)
00000206  2
00000206  2   (* Now, calculate average times and ship to the disc *)
00000206  2
00000206  2   UNLOAD_DM_TIMES ( SYMS_.SYMBOL_COUNT, TIME_ARRAY, UNLD_COUNT,
00000206  2                     R_CODE );
00000226  2
00000226  2   DISPOSE ( TIME_STACK_PTR ) (* Return stack to heap *)
00000238  2 END; (* Procedure UNLOAD_DM *)
00000000  1 $GLOBPROC OFF$
00000000  1 .

509: Warning: field or entry alignment; record or array comparisons may not work

End of compilation, number of errors=    0
```

```
00000000 1 "68000" PREPROCESS
00000000 1 $EXTENSIONS ON$
00000000 1 $LID_ABS_LONG$
00000000 1 $TITLE "Soda Dynamic Controller:  Time Mod Utils"
00000000 1 PROGRAM DM_UTLS;
00000000 1 (*
00000000 1 ****************************** DM_UTLS ******************************
00000000 1   DM_UTLS is the module containing utilities used by the time modules
00000000 1   measurement.  These utilities are accessed by the pre and post
00000000 1   processors for creating/unloading the measurement.
00000000 1   Author:  Kip Fulghum
00000000 1   Date:  8-23-84  Revised:  8-23-84
00000000 1 ************************************************************************
00000000 1
00000000 1   DM_UTLS contains the following routines:
00000000 1   -Global procedure INIT_DM_TIMES initializes all entries in the time
00000000 1    array.
00000000 1   -Global procedure UPDATE_DM_TIMES updates the given procedure's time
00000000 1    record with the given times.
00000000 1   -Global procedure UNLOAD_DM_TIMES unloads the gathered time
00000000 1    information to the trace file.
00000000 1
00000000 1   In addition, DM_UTLS uses the following external routines:
00000000 1   ADD_64, SUB_64, DIV_64, COMPARE_64, WRITE_TIME_REC, and UNLOAD_DONE.
00000000 1                                                                    *)
00000000 1 (*
00000000 1                          **************************
00000000 1                          ***** Include Files *****
00000000 1                          **************************
00000000 1                                                                    *)
00000000 1
00000000 1 #INCLUDE ER_CONST:SS_DYN
00000000 1
00000000 1 #INCLUDE COM_TYPES:SS_DYN
00000000 1
00000000 1 #INCLUDE LD_TYPES:SS_DYN
00000000 1
00000000 1 #INCLUDE UNLD_TYPES:SS_DYN
00000000 1
00000000 1 #INCLUDE ICMD_DATA:SODAMON
00000000 1
00000000 1
00000000 1
00000000 1
00000000 1
00000000 1 $CALL_ABS_LONG$
00000000 1 (*
00000000 1                              ********************
00000000 1                              ***** ADD_64 *****
00000000 1                              ********************
00000000 1                                                                    *)
00000000 1 PROCEDURE ADD_64 ( VAR ADDEND_1, ADDEND_2, ANSWER:  DOUBLE_ARRAY );
00000000 2                    EXTERNAL;
00000000 1 (*
00000000 1   Procedure ADD_64 to do a double add, ie add two 64 bit quantities
00000000 1   to come up with a 64 bit quantity.  Provided as an assembly
00000000 1   language external.
00000000 1
00000000 1
00000000 1
00000000 1
00000000 1
00000000 1
00000000 1 (*
00000000 1                              ********************
00000000 1                              ***** SUB_64 *****
00000000 1                              ********************
00000000 1                                                                    *)
00000000 1 PROCEDURE SUB_64 ( VAR MINUEND, SUBTRAHEND, ANSWER:  DOUBLE_ARRAY );
00000000 2                    EXTERNAL;
00000000 1 (*
00000000 1   Procedure SUB_64 to do a double subtract, ie subtract one 64 bit
00000000 1   quantity from another to come up with a 64 bit quantity.  Provided as
00000000 1   an assembly language external.
00000000 1                                                                    *)
```

```
00000000  1
00000000  1
00000000  1
00000000  1
00000000  1
00000000  1  (*
00000000  1                              ******************
00000000  1                              ***** DIV_64 *****
00000000  1                              ******************
00000000  1                                                                        *)
00000000  1  PROCEDURE DIV_64 ( VAR DIVIDEND:  DOUBLE_ARRAY; DIVISOR:  S_INT;
00000000  2                     VAR QUOTIENT:  DOUBLE_ARRAY; VAR REMAINDER:  L_INT );
00000000  2                     EXTERNAL;
00000000  1  (*
00000000  1    Procedure DIV_64 to divide a 64 bit number by a 16 bit number.
00000000  1    Provided as a Pascal external.
00000000  1                                                                        *)
00000000  1
00000000  1
00000000  1
00000000  1
00000000  1
00000000  1  (*
00000000  1                            **********************
00000000  1                            ***** COMPARE_64 *****
00000000  1                            **********************
00000000  1                                                                        *)
00000000  1
00000000  1  PROCEDURE COMPARE_64 ( FIND_HI:  BOOLEAN; VAR VALUE1, VALUE2, RET_VALUE:
00000000  2                         DOUBLE_ARRAY ); EXTERNAL;
00000000  1  (*
00000000  1    Procedure COMPARE_64 to compare two 64 bit numbers and return the
00000000  1    smaller or larger of the two, whichever is requested.  Provided as a
00000000  1    Pascal external.
00000000  1                                                                        *)
00000000  1
00000000  1
00000000  1
00000000  1
00000000  1
00000000  1  (*
00000000  1                          *************************
00000000  1                          ***** WRITE_TIME_REC *****
00000000  1                          *************************
00000000  1                                                                        *)
00000000  1  PROCEDURE WRITE_TIME_REC ( D_TYPE, INDEX:  S_INT; VAR TIME_REC:
00000000  2                             TIME_REC_TYPE; VAR REC_COUNT, FMGR_CODE:
00000000  2                             S_INT ); EXTERNAL;
00000000  1  (*
00000000  1    Procedure WRITE_TIME_REC to create and write a trace file analysis
00000000  1    record to the disc.  Provided as a Pascal external.
00000000  1                                                                        *)
00000000  1
00000000  1
00000000  1
00000000  1
00000000  1
00000000  1  (*
00000000  1                            **********************
00000000  1                            ***** UNLOAD_DONE *****
00000000  1                            **********************
00000000  1                                                                        *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                                        *)
00000000  1
00000000  1
00000000  1
00000000  1
00000000  1
00000000  1  (*
00000000  1                          *************************
```

```
00000000  1                    ***** INIT_DM_TIMES *****
00000000  1                    *************************
00000000  1                                                                    *)
00000000  1  $GLOBPROC ONS
00000000  1  PROCEDURE INIT_DM_TIMES ( NUM:  S_INT; VAR TIME_STRUCT:
00000000  2                                TIME_ARRAY_TYPE );
00000000  2  (*
00000000  2    Procedure INIT_DM_TIMES to initialize all entries in the time array.
00000000  2    Procedure creates and initializes records for NUM entries in the
00000000  2    array.
00000000  2
00000000  2    Input:  1) NUM, the number of entries to create and initialize in
00000000  2               the array
00000000  2            2) TIME_STRUCT, the time array to be initialized
00000000  2    Output:  1) TIME_STRUCT, the initialized array
00000000  2                                                                    *)
00000000  2  VAR
00000000  2
00000000  2    I:  S_INT; (* FOR loop index *)
00000004  2
00000004  2  BEGIN (* Procedure INIT_DM_TIMES *)
00000004  2
00000004  2    (* Initialize the time array *)
00000004  2
00000004  2    FOR I := 0 TO NUM-1 DO
0000001A  2      BEGIN (* Create time entry for module *)
0000001A  2        NEW ( TIME_STRUCT [ I ] ); (* Create a dynamic time record *)
00000036  2        WITH TIME_STRUCT [ I ]^ DO
00000046  2          BEGIN (* Initialize *)
00000046  2            NUM_SAMPLES := 0;
0000004C  2            CUM_TIME [ 0 ] := 0;
00000056  2            CUM_TIME [ 1 ] := 0;
00000062  2            MIN_TIME [ 0 ] := 07FFFFFFFH;
00000070  2            MIN_TIME [ 1 ] := 0FFFFFFFFH;
00000080  2            MAX_TIME [ 0 ] := 0;
0000008A  2            MAX_TIME [ 1 ] := 0;
00000096  2            AVG_TIME [ 0 ] := 0;
000000A0  2            AVG_TIME [ 1 ] := 0
000000AC  2          END (* Initialize *)
000000AC  2      END (* Create time entry for module *)
000000C0  2  END; (* Procedure INIT_DM_TIMES *)
00000000  1  $GLOBPROC OFFS
00000000  1
00000000  1
00000000  1
00000000  1
00000000  1
00000000  1  (*
00000000  1                   *****************************
00000000  1                   ***** UPDATE_DM_TIMES *****
00000000  1                   *****************************
00000000  1                                                                    *)
00000000  1  $GLOBPROC ONS
00000000  1  PROCEDURE UPDATE_DM_TIMES ( VAR ENTRY_TIME, EXIT_TIME:  DOUBLE_ARRAY;
00000000  2                              VAR TIME_REC:  TIME_REC_TYPE );
00000000  2  (*
00000000  2
00000000  2    Procedure UPDATE_DM_TIMES to update the given procedure's time record
00000000  2    with the given times.  The previous time information in the record is
00000000  2    used in conjunction with the given entry and exit times to compute
00000000  2    execution time and update cumulative, min, max, etc. times for that
00000000  2    module.
00000000  2
00000000  2    UPDATE_DM_TIMES uses the following routines:  ADD_64, SUB_64, and
00000000  2    COMPARE_64.
00000000  2
00000000  2    Input:  1) ENTRY_TIME, the entry time to the module
00000000  2            2) EXIT_TIME, the exit time to the module
00000000  2            3) TIME_REC, the time record whose data is to be updated
00000000  2    Output:  1) TIME_REC, the updated time record
00000000  2                                                                    *)
00000000  2  VAR
00000000  2
00000000  2    CUR_TIME:  DOUBLE_ARRAY; (* Calculated time difference between entry
000000C8  2                                and exit *)
```

```
000000C8  2
000000C8  2  BEGIN (* Procedure UPDATE_DM_TIMES *)
000000C8  2    WITH TIME_REC DO
000000D0  2      BEGIN (* Update # samples, min, max, cum *)
000000D0  2        (* Increment sample count *)
000000D0  2        NUM_SAMPLES := NUM_SAMPLES + 1;
000000D2  2        (* Calculate time difference *)
000000D2  2        SUB_64 ( EXIT_TIME, ENTRY_TIME, CUR_TIME );
000000EE  2        (* Accumulate time for this module *)
000000EE  2        ADD_64 ( CUM_TIME, CUR_TIME, CUM_TIME);
0000010A  2        (* Calculate new minimum time *)
0000010A  2        COMPARE_64 ( FALSE, CUR_TIME, MIN_TIME, MIN_TIME );
00000129  2        (* Calculate new maximum time *)
00000128  2        COMPARE_64 ( TRUE, CUR_TIME, MAX_TIME, MAX_TIME )
00000148  2      END (* Update # samples, min, max, cum *)
00000148  2  END; (* Procedure UPDATE_DM_TIMES *)
00000000  1  $GLOBPROC OFF$
00000000  1
00000000  1
00000000  1
00000000  1
00000000  1
00000000  1  (*
00000000  1                         ****************************
00000000  1                         ***** UNLOAD_DM_TIMES *****
00000000  1                         ****************************
00000000  1                                                                    *)
00000000  1  $GLOBPROC ON$
00000000  1  PROCEDURE UNLOAD_DM_TIMES ( NUM:  S_INT; VAR TIME_STRUCT:
00000000  2                               TIME_ARRAY_TYPE; VAR UN_COUNT, FM_CODE:
00000000  2                               S_INT );
00000000  2  (*
00000000  2    Procedure UNLOAD_DM_TIMES to unload the gathered time information
00000000  2    to the trace file.  As procedure works through the given time
00000000  2    array, average times are computed for each procedure and the
00000000  2    record is then shipped to the file.  UNLOAD_DM_TIMES will
00000000  2    only unload until UN_COUNT reaches the maximum.  Once this occurs
00000000  2    it will simply return to the caller.
00000000  2
00000000  2    UNLOAD_DM_TIMES uses the following routines:  DIV_64, WRITE_TIME_REC,
00000000  2    and UNLOAD_DONE.
00000000  2
00000000  2    Input:  1) NUM, the number of entries to write out
00000000  2            2) TIME_STRUCT, the time array containing the entries
00000000  2            3) UN_COUNT, the number of records unloaded so far
00000000  2    Output:  1) UN_COUNT, the updated number of records unloaded so far
00000000  2             2) FM_CODE, the return code:
00000000  2                  0 indicates no error:  data records completed
00000000  2                  3 indicates file not found:  invalid DCB ( should never
00000000  2                    happen )
00000000  2                  5 indicates no free pages available
00000000  2                  7 indicates file corrupt ,
00000000  2                                                                    *)
00000000  2  VAR
00000000  2
00000000  2    I:  S_INT; (* WHILE loop index *)
00000002  2
00000002  2    REM:  L_INT; (* Division remainder:  not used *)
00000150  2
00000150  2  BEGIN (* Procedure UNLOAD_DM_TIMES *)
00000150  2    FM_CODE := NO_ERROR;
00000156  2    I := 0;
0000015A  2
0000015A  2    (* Calculate average times and ship to the disc *)
0000015A  2
0000015A  2    WHILE ( FM_CODE = NO_ERROR ) AND ( I < NUM ) AND
0000015A  2        ( UNLOAD_DONE ( UN_COUNT ) = FALSE ) DO
00000194  2      WITH TIME_STRUCT [ I ]^ DO
000001A0  2        BEGIN (* Calculate average time and write out time record *)
000001A0  2          (* If current record has any samples, calculate average time *)
000001A0  2          IF NUM_SAMPLES = 0
```

```
000001AA  2             THEN (* Have not seen this module *)
000001AA  2               BEGIN (* Zero out min time *)
000001AA  2                 MIN_TIME [ 0 ] := 0;
000001B0  2                 MIN_TIME [ 1 ] := 0
000001BC  2               END (* Zero out min time *)
000001C0  2             ELSE (* Have seen at least one occurance of module *)
000001CC  2               DIV_64 ( CUM_TIME, NUM_SAMPLES, AVG_TIME, REM ),
000001DE  2           WRITE_TIME_REC ( TIME_DATA, I, TIME_STRUCT [ I ]^, UN_COUNT,
000001DE  2                            FN_CODE );
0000020E  2           DISPOSE ( TIME_STRUCT [ I ] ); (* Get rid of dynamic record *)
0000022A  2           I := I + 1
0000022E  2         END (* Calculate average time and write out time record *)
00000232  2  END; (* Procedure UNLOAD_DM_TIMES *)
00000000  1  $GLOBPROC OFF$
00000000  1  .

503: Warning: field or entry alignment; record or array comparisons may not work

End of compilation, number of errors=    0
00000000  1  "68000" PREPROCESS
00000000  1  $EXTENSIONS ON$
00000000  1  $LID_ABS_LONG$
00000000  1  $TITLE "Soda Dynamic Controller:  Count Statements"
00000000  1  PROGRAM COUNT_STAT;
00000000  1  (*
00000000  1  ****************************** COUNT_STAT ******************************
00000000  1    COUNT_STAT is the module containing the routines for the load pre-
00000000  1    processor and the unload post-processor for the count statements
00000000  1    measurement.  For pre-processing, the user measurement data structure
00000000  1    is translated to reflect a count statements measurement.  For post-
00000000  1    processing, the measurement data is unloaded from the hardware,  all
00000000  1    garbage is removed, and the current trace file is updated with all
00000000  1    valid measurement data.
00000000  1    Author:  Kip Fulghum
00000000  1    Date:  11-23-83  Revised:  10-21-84
00000000  1  ************************************************************************
00000000  1
00000000  1    COUNT_STAT contains the following routines:
00000000  1    -Global procedure LOAD_CS is the pre-processor for the count
00000000  1     statements measurement.  It sets up the count enable path and
00000000  1     creates the data structure for the hardware loader.
00000000  1    -Global procedure UNLOAD_CS is the post-processor for the count
00000000  1     statements measurement.  It unloads the hardware one counter at
00000000  1     a time, creating valid trace file data records.
00000000  1
00000000  1    In addition, COUNT_STAT uses the following external routines:
00000000  1    START_GEN, CLOSE_IO_MODE,
00000000  1    GET_MICRO_COUNT, CLEAR_FP_CNTR, GREY_BIN, WRITE_COUNT_REC,
00000000  1    UNLOAD_DONE.
00000000  1    GET_OFFSET, P_ADDR,
00000000  1    and SET_CS_PATHS.
00000000  1                                                                       *)
00000000  1  (*
00000000  1                         **************************
00000000  1                         ***** Include Files *****
00000000  1                         **************************
00000000  1                                                                       *)
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1  VAR
00000000  1
00000000  1  $EXTVAR ON$
00000000  1
00000000  1    CONTROL_ARRAY:  CNTRL_ARRAY_TYPE; (* Array of copies of the
00000000  1                                        system control words/bytes *)
00000000  1
```

```
00000000 1  $EXTVAR OFF$
00000000 1
00000000 1
00000000 1
00000000 1
00000000 1
00000000 1  $CALL_ABS_LONG$
00000000 1  (*
00000000 1                          **********************
00000000 1                          ***** START_GEN *****
00000000 1                          **********************
00000000 1                                                                  *)
00000000 1  PROCEDURE START_GEN ( VAR GENERATOR:  FUNC_RESOURCE; START_STATE,
00000000 2                        NEXT_STATE:  S_INT; VAR STATE_PTR:  STATE_REC_PTR;
00000000 2                        VAR IO_PTR:  I_O_REC_PTR; VAR HIGH_SET:
00000000 2                        HIGH_LEVEL_SET ); EXTERNAL;
00000000 1  (*
00000000 1    Procedure START_GEN to prepare a function generator for use.
00000000 1    Provided as a Pascal external.
00000000 1                                                                  *)
00000000 1
00000000 1
00000000 1
00000000 1
00000000 1
00000000 1  (*
00000000 1                          **************************
00000000 1                          ***** CLOSE_IO_NODE *****
00000000 1                          **************************
00000000 1                                                                  *)
00000000 1  PROCEDURE CLOSE_IO_NODE ( FINAL_OUTS:  OUT_SET_TYPE; VAR IO:  I_O_REC;
00000000 2                            VAR CLOSE_CODE:  S_INT ); EXTERNAL;
00000000 1  (*
00000000 1    Procedure CLOSE_IO_NODE to close out a function generator I/O node.
00000000 1    Provided as a Pascal external.
00000000 1                                                                  *)
00000000 1
00000000 1
00000000 1
00000000 1
00000000 1
00000000 1  (*
00000000 1                          ****************************
00000000 1                          ***** GET_MICRO_COUNT *****
00000000 1                          ****************************
00000000 1                                                                  *)
00000000 1  PROCEDURE GET_MICRO_COUNT ( COUNTER:  S_INT; VAR COUNT:  S_INT );
00000000 2                              EXTERNAL;
00000000 1  (*
00000000 1    Procedure GET_MICRO_COUNT to retrieve the indicated hardware micro-
00000000 1    count from the hardware.  Provided as an assembly language external.
00000000 1                                                                  *)
00000000 1
00000000 1
00000000 1
00000000 1
00000000 1
00000000 1  (*
00000000 1                          **************************
00000000 1                          ***** CLEAR_FP_CNTR *****
00000000 1                          **************************
00000000 1                                                                  *)
00000000 1
00000000 1
00000000 1  PROCEDURE CLEAR_FP_CNTR ( CUR_CNTRL_2, CUR_MEM_BYTE:  L_INT; VAR
00000000 2                            GREY_COUNT:  L_INT ); EXTERNAL;
00000000 1  (*
00000000 1    Procedure CLEAR_FP_CNTR clears the floating point counter and returns
00000000 1    the grey value currently in it.  Provided as an assembly language
00000000 1    external.
00000000 1                                                                  *)
00000000 1
00000000 1
00000000 1
```

```
00000000  1
00000000  1
00000000  1  (*
00000000  1                           *********************
00000000  1                           ***** GREY_BIN *****
00000000  1                           *********************
00000000  1                                                                    *)
00000000  1  PROCEDURE GREY_BIN ( GREY:  L_INT; VAR BINARY:  DOUBLE_ARRAY; VAR
00000000  2                       RESET:  BOOLEAN ); EXTERNAL;
00000000  1  (*
00000000  1    Procedure GREY_BIN to convert a grey-code count into an ordinary
00000000  1    binary count.  Provided as an assembly language external.
00000000  1                                                                    *)
00000000  1
00000000  1
00000000  1
00000000  1
00000000  1
00000000  1  (*
00000000  1                       *****************************
00000000  1                       ***** WRITE_COUNT_REC *****
00000000  1                       *****************************
00000000  1                                                                    *)
00000000  1  PROCEDURE WRITE_COUNT_REC ( D_TYPE, LINE:  S_INT; VAR COUNT:
00000000  2                              DOUBLE_ARRAY; VAR REC_COUNT, FNGR_CODE:
00000000  2                              S_INT ); EXTERNAL;
00000000  1  (*
00000000  1    Procedure WRITE_COUNT_REC to create and write a trace file count
00000000  1    record to the disc.  Provided as a Pascal external.
00000000  1                                                                    *)
00000000  1
00000000  1
00000000  1
00000000  1
00000000  1
00000000  1  (*
00000000  1                         *************************
00000000  1                         ***** UNLOAD_DONE *****
00000000  1                         *************************
00000000  1                                                                    *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                                    *)
00000000  1
00000000  1
00000000  1
00000000  1
00000000  1
00000000  1  (*
00000000  1                          ***********************
00000000  1                          ***** GET_OFFSET *****
00000000  1                          ***********************
00000000  1                                                                    *)
00000000  1  FUNCTION GET_OFFSET:  L_INT; EXTERNAL;
00000000  1  (*
00000000  1    Function GET_OFFSET to return the appropriate processor pre-fetch
00000000  1    offset.  Provided as a Pascal external.
00000000  1                                                                    *)
00000000  1
00000000  1
00000000  1
00000000  1
00000000  1
00000000  1  (*
00000000  1                           ********************
00000000  1                           ***** P_ADDR *****
00000000  1                           ********************
00000000  1                                                                    *)
00000000  1  PROCEDURE P_ADDR ( LOGICAL_ADDR:  L_INT; VAR PHYSICAL_ADDR:  L_INT );
00000000  2                     EXTERNAL;
00000000  1  (*
00000000  1    Procedure P_ADDR to return the physical address equivalent of the
```

```
00000000 1   given logical address.  Provided as a Pascal external.
00000000 1                                                                  *)
00000000 1
00000000 1
00000000 1
00000000 1
00000000 1
00000000 1 $CALL_PC_SHORTS
00000000 1 (*
00000000 1                         *************************
00000000 1                         ***** SET_CS_PATHS *****
00000000 1                         *************************
00000000 1                                                                  *)
00000000 1 PROCEDURE SET_CS_PATHS ( VAR LINE_REC:  CMD_DATA_TYPE; ID:  S_INT; VAR
00000000 2                          HIGHS:  HIGH_LEVEL_SET; VAR SPEC:  HW_SPEC_REC;
00000000 2                          VAR IO:  I_O_REC; VAR SET_CODE:  S_INT );
00000000 2                          EXTERNAL;
00000000 1 (*
00000000 1   Procedure SET_CS_PATHS to set up the needed resource paths for the
00000000 1   given line range.  Provided as a Pascal external.
00000000 1                                                                  *)
00000000 1
00000000 1
00000000 1
00000000 1
00000000 1
00000000 1 (*
00000000 1                          ********************
00000000 1                          ***** LOAD_CS *****
00000000 1                          ********************
00000000 1                                                                  *)
00000000 1 $GLOBPROC ON$
00000000 1 PROCEDURE LOAD_CS ( VAR MEAS_:  CMD_DATA_ARRAY; VAR SYMS_:
00000000 2                     SYM_DESCRIPS; VAR SPEC_:  HW_SPEC_REC; VAR R_CODE:
00000000 2                     S_INT );
00000000 2 (*
00000000 2   Procedure LOAD_CS is the pre-processor for the count statements
00000000 2   measurement.  It loads the appropriate data structures with the
00000000 2   necessary information to create count statements when loaded into
00000000 2   the hardware.
00000000 2
00000000 2   LOAD_CS uses the following routines:  START_GEN, CLOSE_IO_MODE,
00000000 2   SET_OFFSET, P_ADDR, and SET_CS_PATHS.
00000000 2
00000000 2   Input:  1) MEAS_, the input structure to the loader indicating
00000000 2              what the measurement is
00000000 2           2) SYMS_, a list of all unique symbols involved in the
00000000 2              measurement
00000000 2           3) SPEC_, the initialized hardware specification structure
00000000 2   Output:  1) SPEC_, the completed hardware record containing
00000000 2               specifications for usage of the:
00000000 2              a) low level resources,
00000000 2              b) high level resources,
00000000 2              c) fast sequencer,
00000000 2              d) micro-code occurance counters,
00000000 2              e) function generators,
00000000 2              f) misc. signals,
00000000 2              g) occurance counters,
00000000 2              h) extraneous features
00000000 2           2) R_CODE, a code specifying how the load turned out:
00000000 2                -6 indicates translation error:  function description
00000000 2                   overflow
00000000 2                -4 indicates out of high level hardware resources
00000000 2                -3 indicates out of low level hardware resources
00000000 2                 0 indicates no error:  load completed
00000000 2                                                                  *)
00000000 2 VAR
00000000 2
00000000 2   I:  S_INT; (* Outer WHILE loop index *)
00000002 2
00000002 2   J:  S_INT; (* Inner WHILE loop index *)
00000004 2
00000004 2   STATE:  STATE_REC_PTR; (* Current function generator state node *)
00000008 2
```

```
00000008 2    IO:  I_O_REC_PTR; (* Current function generator input/output node *)
0000000C 2
0000000C 2    HL_SET:  HIGH_LEVEL_SET; (* Current set of useable high level
0000000E 2                              resources *)
0000000E 2
0000000E 2    LINE_INDEX:  S_INT; (* Index into cmd stack of line range *)
00000010 2
00000010 2    PREFETCH:  L_INT; (* Pre-fetch offset *)
00000014 2
00000014 2    PHYSICAL:  L_INT; (* Physical address *)
00000004 2
00000004 2  BEGIN (* Procedure LOAD_CS *)
00000004 2    R_CODE := NO_ERROR; (* Be optimistic *)
0000000A 2    NEW ( SPEC_.MICRO_COUNTERS ); (* Create counter structure *)
00000020 2    SPEC_.MICRO_COUNTERS^.NUM_LINES := 0; (* Initialize line count *)
0000002A 2    (* Get processor pre-fetch offset *)
0000002A 2    PREFETCH := GET_OFFSET;
00000034 2
00000034 2    (* Find lines to count *)
00000034 2
00000034 2    I := 0;
00000038 2    WHILE MEAS_ [ I ].OP_CODE <> EOL DO
00000050 2      BEGIN (* Find line arrays *)
00000050 2        IF MEAS_ [ I ].OP_CODE = LINES
00000064 2          THEN (* Found one *)
00000064 2            BEGIN (* Look for line address information *)
00000064 2              J := 0;
00000068 2              WHILE ( ( MEAS_ [ I ].ADDRS [ J ] <> -1 ) AND
00000068 2                    ( J <= 18 ) ) DO
000000A6 2                WITH SPEC_.MICRO_COUNTERS^ DO
000000B0 2                  BEGIN (* Set up count address *)
000000B0 2                    (* Logical --> physical *)
000000B0 2                    P_ADDR ( MEAS_ [ I ].ADDRS [ J ], PHYSICAL );
000000D2 2                    (* Add in PREFETCH *)
000000D2 2                    LINE_ADRS [ NUM_LINES ] := PHYSICAL + PREFETCH;
000000EA 2                    NUM_LINES := NUM_LINES + 1;
000000F0 2                    J := J + 1
000000F4 2                  END (* Set up count address *)
000000F8 2            END; (* Look for line address information *)
000000F8 2        I := I + 1
000000FC 2      END; (* Find line arrays *)
00000100 2
00000100 2    (* Start state machine:  use Y generator *)
00000100 2
00000100 2    START_GEN ( SPEC_.FUNC_GENERATORS [ Y ], 0, 0, STATE, IO, HL_SET );
00000128 2
00000128 2    (* Assign all necessary resources *)
00000128 2
00000128 2    LINE_INDEX := SYMS_.SYMBOL_ARRAY [ 0 ].DESCRIP_INDEX;
00000134 2    SET_CS_PATHS ( MEAS_ [ LINE_INDEX ], 0, HL_SET, SPEC_, IO^, R_CODE );
00000166 2    CLOSE_IO_MODE ( [ COUNT ], IO^, R_CODE )
00000182 2  END; (* Procedure LOAD_CS *)
00000000 1  $GLOBPROC OFF$
00000000 1
00000000 1
00000000 1
00000000 1
00000000 1
00000000 1  (*
00000000 1                        **********************
00000000 1                        ***** UNLOAD_CS *****
00000000 1                        **********************
00000000 1                                                                  *)
00000000 1  $GLOBPROC ON$
00000000 1  PROCEDURE UNLOAD_CS ( VAR MEAS_:  CMD_DATA_ARRAY; VAR SYMS_:
00000000 2                        SYM_DESCRIPS; VAR FLAGS_:  FLAG_ARRAY_TYPE; MAC_:
00000000 2                        S_INT; VAR SPEC_:  HW_SPEC_REC; VAR UNLD_COUNT,
00000000 2                        R_CODE:  S_INT );
00000000 2  (*
00000000 2    Procedure UNLOAD_CS is the post-processor for the count statements
00000000 2    measurement.  It unloads the hardware one counter at a time,
00000000 2    classifying the data, and creating valid trace file data records.
00000000 2
00000000 2    UNLOAD_CS uses the following routines:  GET_MICRO_COUNT,
```

```
00000000  2     CLEAR_FP_CNTR, GREY_BIN, WRITE_COUNT_REC, and UNLOAD_DONE.
00000000  2
00000000  2     Input:  1) MEAS_, the structure describing the measurement at a high
00000000  2                level
00000000  2             2) SYMS_, a list of all unique symbols involved in the
00000000  2                measurement
00000000  2             3) FLAGS_, the flag word data structure containing the
00000000  2                most recently read hardware flags
00000000  2             4) MAC_, the memory address counter off the memory board
00000000  2                obtained before unloading began
00000000  2             5) SPEC_, the hardware specification which captured the
00000000  2                data
00000000  2             6) UNLD_COUNT, the previous # of states unloaded and
00000000  2                shipped out to the trace file
00000000  2     Output:  1) SPEC_, the possibly modified hardware specification
00000000  2                 structure
00000000  2              2) UNLD_COUNT, the updated # of states unloaded and output
00000000  2                 to the trace file
00000000  2              3) R_CODE, the return code indicating how things turned out:
00000000  2                   0 indicates no error:  data records completed
00000000  2                   1 indicates end of file ( should never happen )
00000000  2                   2 indicates invalid disc ( should never happen )
00000000  2                   3 indicates file not found:  invalid DCB ( should never
00000000  2                     happen )
00000000  2                   5 indicates no free pages available
00000000  2                   7 indicates file corrupt
00000000  2                                                                         *)
00000000  2  VAR
00000000  2
00000000  2     CUR_LINE:  S_INT; (* Current line # for count being unloaded *)
00000002  2
00000002  2     CUR_COUNT:  S_INT; (* Current counter value *)
00000004  2
00000004  2     GREY_COUNT:  L_INT; (* Grey count from F.P. counter *)
00000008  2
00000008  2     MEM_COUNT:  S_INT; (* Memory unload count *)
0000000A  2
0000000A  2     LINE_INDEX:  S_INT; (* Index into cmd stack of line range *)
0000000C  2
0000000C  2     NORMAL_COUNT:  DOUBLE_ARRAY; (* Storage for decoded grey code count *)
00000014  2
00000014  2     RESET: BOOLEAN; (* Dummy boolean for GREY_BIN *)
0000018A  2
0000018A  2  BEGIN (* Procedure UNLOAD_CS *)
0000018A  2    R_CODE := NO_ERROR; (* Be optimistic *)
00000190  2    LINE_INDEX := SYMS_.SYMBOL_ARRAY [ 0 ].DESCRIP_INDEX;
0000019C  2
0000019C  2    CUR_LINE := MEAS_ [ LINE_INDEX ].LINE1; (* Start with first line *)
000001B2  2    IF SPEC_.MICRO_COUNTERS^.NUM_LINES = 1
000001C4  2      THEN (* Only counting one line *)
000001C4  2        BEGIN (* Get the one count *)
000001C4  2
000001C4  2          (* Read value in floating point counter *)
000001C4  2
000001C4  2          CLEAR_FP_CNTR ( CONTROL_ARRAY [ CONTROL_2 ],
000001C4  2                          CONTROL_ARRAY [ CONTROL_BYTE ], GREY_COUNT );
000001DC  2          (* Convert value to 64 bit binary *)
000001DC  2          GREY_BIN ( GREY_COUNT, NORMAL_COUNT, RESET );
000001F4  2
000001F4  2          (* Write value to trace file *)
000001F4  2          IF UNLOAD_DONE ( UNLD_COUNT ) = FALSE
0000020A  2            THEN (* Not done yet *)
0000020A  2              WRITE_COUNT_REC ( COUNT_DATA, CUR_LINE, NORMAL_COUNT,
0000020A  2                                UNLD_COUNT, R_CODE )
0000022E  2        END (* Get the one count *)
00000232  2      ELSE (* Counting multiple lines *)
00000232  2        BEGIN (* Get all counts *)
00000232  2          MEM_COUNT := 0;
00000236  2
00000236  2          (* Get counts out of hardware *)
00000236  2
00000236  2          WHILE ( MEM_COUNT < SPEC_.MICRO_COUNTERS^.NUM_LINES ) AND
00000236  2                ( UNLOAD_DONE ( UNLD_COUNT ) = FALSE ) AND
00000236  2                ( R_CODE = NO_ERROR ) DO
```

```
0000027E  2              BEGIN (* Unload micro-code occurance counters *)
0000027E  2                NORMAL_COUNT [ 0 ] := 0; (* Assume no overflow *)
00000292  2                GET_MICRO_COUNT ( MEM_COUNT. CUR_COUNT );
00000292  2                (* Check for overflow *)
00000292  2                IF CUR_COUNT = OFFFH
0000029E  2                  THEN (* Yup:  overflow *)
0000029E  2                    BEGIN (* Set overflow indicator *)
0000029E  2                      NORMAL_COUNT [ 0 ] := -1;
000002A6  2                      NORMAL_COUNT [ 1 ] := -1
000002AE  2                    END  (* Set overflow indicator *)
000002B2  2                  ELSE (* No overflow *)
000002B2  2                    NORMAL_COUNT [ 1 ] := CUR_COUNT;
000002BC  2
000002BC  2                (* Write value to trace file *)
000002BC  2                WRITE_COUNT_REC ( COUNT_DATA, CUR_LINE, NORMAL_COUNT,
000002BC  2                                  UNLD_COUNT, R_CODE );
000002E0  2                MEM_COUNT := MEM_COUNT + 1;
000002E4  2                CUR_LINE := CUR_LINE + 1
000002E8  2              END (* Unload micro code occurance counters *)
000002EC  2          END; (* Get all counts *)
000002EC  2    DISPOSE ( SPEC_.MICRO_COUNTERS ) (* Dispose of counter structure *)
00000302  2  END; (* Procedure UNLOAD_CS *)
00000000  1  $GLOBPROC OFF$
00000000  1  .

508: Warning: field or entry alignment; record or array comparisons may not work

End of compilation, number of errors=    0
00000000  1  "68000" PREPROCESS
00000000  1  $EXTENSIONS ON$
00000000  1  $TITLE "Soda Dynamic Controller:  Count Stat Utils"
00000000  1  PROGRAM CS_UTLS;
00000000  1  (*
00000000  1  ******************************** CS_UTLS ********************************
00000000  1    CS_UTLS is the module containing utilities used by the count
00000000  1    statements measurement.  These utilities are accessed by the pre and
00000000  1    post processors for creating/unloading the measurement.
00000000  1    Author:  Kip Fulghum
00000000  1    Date:  8-23-84  Revised:  8-23-84
00000000  1  ***************************************************************************
00000000  1
00000000  1    CS_UTLS contains the following routines:
00000000  1    -Global procedure SET_CS_PATHS sets up the needed resource paths for
00000000  1     the given line range.
00000000  1
00000000  1    In addition, CS_UTLS uses the following external routines:
00000000  1    ASSIGN_LL_RSRC, ADD_PATH,
00000000  1    GET_VALUE_MASK, GET_BUS_MASK, GET_OFFSET, and P_ADDR.
00000000  1                                                                        *)
00000000  1  (*
00000000  1                        *************************
00000000  1                        ***** Include Files *****
00000000  1                        *************************
00000000  1                                                                        *)
00000000  1
00000000  1  #INCLUDE ER_CONST:SS_DYN
00000000  1
00000000  1  #INCLUDE COM_TYPES:SS_DYN
00000000  1
00000000  1  #INCLUDE LD_TYPES:SS_DYN
00000000  1
00000000  1  #INCLUDE UNLD_TYPES:SS_DYN
00000000  1
00000000  1  #INCLUDE ICMD_DATA:SODAMON
00000000  1
00000000  1
00000000  1
00000000  1
00000000  1
00000000  1  $CALL_ABS_LONG$
00000000  1  (*
00000000  1                        ***************************
00000000  1                        ***** ASSIGN_LL_RSRC *****
00000000  1                        ***************************
```

```
00000000  1                                                          *)
00000000  1  FUNCTION ASSIGN_LL_RSRC ( RSRC_TYPE:  LL_TYPE; RSRC_ID:  S_INT;
00000000  2                            LO_VALUE, LO_MASK, HI_VALUE, HI_MASK:
00000000  2                            L_INT; VAR LL_ARRAY:  LL_ARRAY_TYPE ):  S_INT;
00000002  2                            EXTERNAL;
00000000  1  (*
00000000  1    Function ASSIGN_LL_RSRC to allocate a low level resource from those
00000000  1    available for use by the caller.  Provided as a Pascal external.
00000000  1                                                          *)
00000000  1
00000000  1
00000000  1
00000000  1
00000000  1
00000000  1  (*
00000000  1                            ********************
00000000  1                            ***** ADD_PATH *****
00000000  1                            ********************
00000000  1                                                          *)
00000000  1  PROCEDURE ADD_PATH ( RSRC_TYPE:  LL_TYPE; PATH_ID:  S_INT; LO_VALUE,
00000000  2                       LO_MASK, HI_VALUE, HI_MASK:  L_INT; VAR
00000000  2                       POS_HL_SET:  HIGH_LEVEL_SET; VAR LO_ARRAY:
00000000  2                       LL_ARRAY_TYPE; VAR HI_ARRAY:  HL_ARRAY_TYPE;
00000000  2                       VAR IO:  I_O_REC; VAR CODE:  S_INT ); EXTERNAL;
00000000  1  (*
00000000  1    Procedure ADD_PATH to create and add a low to high level resource
00000000  1    path to the given function generator I/O node's input function
00000000  1    description.  Provided as a Pascal external.
00000000  1                                                          *)
00000000  1
00000000  1
00000000  1
00000000  1
00000000  1
00000000  1  (*
00000000  1                          **************************
00000000  1                          ***** GET_VALUE_MASK *****
00000000  1                          **************************
00000000  1                                                          *)
00000000  1  PROCEDURE GET_VALUE_MASK ( ACCESS:  S_INT; VAR VALUE, MASK:  L_INT );
00000000  2                             EXTERNAL;
00000000  1  (*
00000000  1    Procedure GET_VALUE_MASK to determine the appropriate value and
00000000  1    mask for tracing different processor status, ie reads, writes, etc.
00000000  1    Provided as a Pascal external.
00000000  1                                                          *)
00000000  1
00000000  1
00000000  1
00000000  1
00000000  1
00000000  1  (*
00000000  1                          ************************
00000000  1                          ***** GET_BUS_MASK *****
00000000  1                          ************************
00000000  1                                                          *)
00000000  1  FUNCTION GET_BUS_MASK ( BUS:  S_INT ):  L_INT; EXTERNAL;
00000000  1  (*
00000000  1    Function GET_BUS_MASK to return the processor specific mask containing
00000000  1    all 1s for all bits on the given bus.  Provided as a Pascal external.
00000000  1                                                          *)
00000000  1
00000000  1
00000000  1
00000000  1
00000000  1
00000000  1  (*
00000000  1                            **********************
00000000  1                            ***** GET_OFFSET *****
00000000  1                            **********************
00000000  1                                                          *)
00000000  1  FUNCTION GET_OFFSET:  L_INT; EXTERNAL;
00000000  1  (*
00000000  1    Function GET_OFFSET to return the appropriate processor pre-fetch
```

```
00000000 1    offset.  Provided as a Pascal external.
00000000 1                                                                   *)
00000000 1
00000000 1
00000000 1
00000000 1
00000000 1
00000000 1  (*
00000000 1                                 *******************
00000000 1                                 ***** P_ADDR *****
00000000 1                                 *******************
00000000 1                                                                   *)
00000000 1  PROCEDURE P_ADDR ( LOGICAL_ADDR:  L_INT; VAR PHYSICAL_ADDR:  L_INT );
00000000 2                     EXTERNAL;
00000000 1  (*
00000000 1    Procedure P_ADDR to return the physical address equivalent of the
00000000 1    given logical address.  Provided as a Pascal external.
00000000 1                                                                   *)
00000000 1
00000000 1
00000000 1
00000000 1
00000000 1
00000000 1  (*
00000000 1                               ************************
00000000 1                               ***** SET_CS_PATHS *****
00000000 1                               ************************
00000000 1                                                                   *)
00000000 1  $GLOBPROC ON$
00000000 1  PROCEDURE SET_CS_PATHS ( VAR LINE_REC:  CMD_DATA_TYPE; ID:  S_INT; VAR
00000000 2                           HIGHS:  HIGH_LEVEL_SET; VAR SPEC:  HW_SPEC_REC;
00000000 2                           VAR IO:  I_O_REC; VAR SET_CODE:  S_INT );
00000000 2  (*
00000000 2    Procedure SET_CS_PATHS to set up the needed resource paths for the
00000000 2    given line range.  Procedure simply adds all needed paths to the given
00000000 2    I/O node, one at a time.  If any path cannot be created, an error is
00000000 2    returned.
00000000 2
00000000 2    SET_CS_PATHS uses the following routines:  ASSIGN_LL_RSRC, ADD_PATH,
00000000 2    GET_VALUE_MASK, GET_BUS_MASK, GET_OFFSET, and P_ADDR.
00000000 2
00000000 2    Input:  1) LINE_REC, the record describing the line range to be traced
00000000 2            2) ID, the basis for the resource I.D.s to be assigned to
00000000 2               the paths
00000000 2            3) HIGHS, the set of possible high level resources to choose
00000000 2               from when creating the paths
00000000 2            4) SPEC, the current hardware specification
00000000 2            5) IO, the input/output record to add the paths to
00000000 2    Output:  1) SPEC, the modified hardware specification from which the
00000000 2                resources were allocated
00000000 2             2) IO, the modified input/output record
00000000 2             3) SET_CODE, a return code describing how it went:
00000000 2                 -6 indicates function overflow
00000000 2                 -4 indicates out of high level hardware resources
00000000 2                 -3 indicates out of low level hardware resources
00000000 2                  0 indicates no error:  all assignments completed
00000000 2                                                                   *)
00000000 2  VAR
00000000 2
00000000 2    OP_VALUE:  L_INT; (* Processor value for opcode fetch *)
00000004 2
00000004 2    OP_MASK:  L_INT; (* Processor mask for opcode fetch *)
00000008 2
00000008 2    ADDR_MASK:  L_INT; (* Processor mask for address bus *)
0000000C 2
0000000C 2    RSRC_VALUE:  L_INT; (* Value to load resource with *)
00000010 2
00000010 2    RSRC_MASK:  L_INT; (* Mask to load resource with *)
00000014 2
00000014 2    NEXT_LL:  S_INT; (* Next assigned low level resource *)
00000004 2
00000004 2  BEGIN (* Procedure SET_CS_PATHS *)
00000004 2    SET_CODE := NO_ERROR; (* It should work *)
0000000A 2
```

```
0000009A  2    (* Get processor specific values/masks *)
0000000A  2
0000000A  2    GET_VALUE_MASK ( OPCODE, OP_VALUE, OP_MASK );
00000022  2    ADDR_MASK := GET_BUS_MASK ( 0 );
00000030  2    RSRC_MASK := OP_MASK + ADDR_MASK;
0000003C  2
0000003C  2    (* Turn on opcode resource *)
0000003C  2
0000003C  2    NEXT_LL := ASSIGN_LL_RSRC ( OPCODE_EQUATE, 999, OP_VALUE+ADDR_MASK,
0000003C  2                                OP_MASK, 0, 0, SPEC.LOW_LEVELS );
0000006C  2
0000006C  2    (* Get resource to watch line range *)
0000006C  2
0000006C  2    (* Logical --> physical *)
0000006C  2    P_ADDR ( LINE_REC.ADDRESS, RSRC_VALUE );
00000080  2    RSRC_VALUE := RSRC_VALUE + OP_VALUE;
00000088  2
00000088  2    IF SPEC.MICRO_COUNTERS^.NUM_LINES = 1
0000009A  2      THEN (* Only counting one line *)
0000009A  2        BEGIN (* Set up equate to count single line *)
0000009A  2          (* Add GET_OFFSET for pre-fetch *)
0000009A  2          RSRC_VALUE := RSRC_VALUE + GET_OFFSET;
000000A4  2          ADD_PATH ( ADDRESS_EQUATE, ID, RSRC_VALUE, RSRC_MASK, 0, 0,
000000A4  2                     HIGHS, SPEC.LOW_LEVELS, SPEC.HIGH_LEVELS, ID,
000000A4  2                     SET_CODE )
000000E4  2        END (* Set up equate to count single line *)
000000E8  2      ELSE (* Counting more than one line *)
000000E8  2        (* Set up range to count multiple lines:  pre-fetch fixed
000000E8  2           elsewhere *)
000000E8  2        ADD_PATH ( ADDRESS_RANGE, ID, RSRC_VALUE, RSRC_MASK,
000000E8  2                   RSRC_VALUE+LINE_REC.SIZE-1, RSRC_MASK, HIGHS,
000000E8  2                   SPEC.LOW_LEVELS, SPEC.HIGH_LEVELS, ID, SET_CODE )
00000138  2  END; (* Procedure SET_CS_PATHS *)
00000000  1  $GLOBPROC OFFS
00000000  1  .

508: Warning: field or entry alignment; record or array comparisons may not work

End of compilation, number of errors=    0
```

```
00000000  1  "68000" PREPROCESS
00000000  1
00000000  1  (**********************************)
00000000  1  (* Filename: TRACE_AMO:SS_DYN     *)
00000000  1  (* Author:   Dan Schmelzer        *)
00000000  1  (* Initial Date:  5/08/84         *)
00000000  1  (* Revised Date:  1/11/85         *)
00000000  1  (**********************************)
00000000  1
00000000  1  (*************************************************************************)
00000000  1  (* SODA DYNAMIC CONTROLLER; TRACE MODULES ALL                            *)
00000000  1  (*************************************************************************)
00000000  1
00000000  1
00000000  1  (*************************************************************************)
00000000  1  (* Procedures and/or Functions contained in this file:                   *)
00000000  1  (*                                                                       *)
00000000  1  (*    Name                         What it does                          *)
00000000  1  (* ---------------  ------------------------------------------------    *)
00000000  1  (* CLASSIFY_HOOK    Function which searches the list of processor       *)
00000000  1  (*                  dependent entry/exit hooks looking for match        *)
00000000  1  (*                  with the data field of the captured sextet.         *)
00000000  1  (*                  It returns the type of hook, entry versus exit,     *)
00000000  1  (*                  if the search is successful.                        *)
00000000  1  (*                                                                       *)
00000000  1  (* GET_HOOK_OFFSET  Procedure which gets the offset of the captured      *)
00000000  1  (*                  address (from the hardware sextet) relative to      *)
00000000  1  (*                  the entry or exit address of the procedure for      *)
00000000  1  (*                  which the captured address belongs.                 *)
00000000  1  (*                                                                       *)
00000000  1  (* LOAD_TMA         Global procedure which is the pre-processor for     *)
00000000  1  (*                  the trace modules all measurement.  It loads        *)
00000000  1  (*                  the appropiate data structures with the             *)
00000000  1  (*                  necessary information to create a trace modules     *)
00000000  1  (*                  all measurement when loaded into the hardware.      *)
```

```
00000000 1 (*                                                              *)
00000000 1 (* UNLOAD_TMA          Global procedure which is the post-processor   *)
00000000 1 (*                     for the trace modules all measurement.  It    *)
00000000 1 (*                     unloads the hardware one sextuplet at a time,  *)
00000000 1 (*                     clasifying the data, filtering out certain    *)
00000000 1 (*                     data, and creating valid trace file data      *)
00000000 1 (*                     records.                                      *)
00000000 1 (*                                                              *)
00000000 1 (****************************************************************)
00000000 1 (* External procedures called from this file:                    *)
00000000 1 (*                                                              *)
00000000 1 (*               GET_TMA_HOOKS                CLOSE_IO_MODE      *)
00000000 1 (*               TMA_FILTER                   CLOSE_IO_LIST      *)
00000000 1 (*               GET_VALUE_MASK               HOW_MUCH_DATA      *)
00000000 1 (*               P_ADDR                       GET_DATA           *)
00000000 1 (*               START_GEN                    WRITE_ANLYS_REC    *)
00000000 1 (*               MERGE_LL_RSRC                UNLOAD_MSG         *)
00000000 1 (*               REVERSE_LL_RSRC              ADD_OPERAND        *)
00000000 1 (*               ADD_PATH                     ADD_OPERATOR       *)
00000000 1 (*                                            FIX_TM_INDENT      *)
00000000 1 (*                                                              *)
00000000 1 (* External functions called from this file:                     *)
00000000 1 (*                                                              *)
00000000 1 (*               GET_BUS_MASK                 ASSIGN_PATH        *)
00000000 1 (*               ASSIGN_LL_RSRC               MASK_BITS          *)
00000000 1 (*               UNLOAD_DONE                  MATCH_BITS         *)
00000000 1 (****************************************************************)
00000000 1 (* Expansion of data types used in this file:                    *)
00000000 1 (*                                                              *)
00000000 1 (*   TR_MOD variant:    MEAS_ [0..n]                             *)
00000000 1 (*                        .OP_CODE                               *)
00000000 1 (*                                                              *)
00000000 1 (*   PROC_OP variant,                                            *)
00000000 1 (*   FILE_OP variant:   MEAS_ [0..n]                             *)
00000000 1 (*                        .OP_CODE                               *)
00000000 1 (*                        .PROC_NUM                              *)
00000000 1 (*                        .FILE_NUM                              *)
00000000 1 (*                        .DISC_NUM                              *)
00000000 1 (*                        .FLAGS                                 *)
00000000 1 (*                        .STATUS                                *)
00000000 1 (*                        .LINE1                                 *)
00000000 1 (*                        .LINE2                                 *)
00000000 1 (*                        .PROC_NAME [0..7]                      *)
00000000 1 (*                        .FILE_NAME [0..7]                      *)
00000000 1 (*                        .ADDRESS                               *)
00000000 1 (*                        .SIZE                                  *)
00000000 1 (*                        .ENTRY                                 *)
00000000 1 (*                        .EXIT                                  *)
00000000 1 (*                        .DB_PTR                                *)
00000000 1 (*                        .DB_LENGTH                             *)
00000000 1 (*                        .ENTRY_OFFSET                          *)
00000000 1 (*                        .EXIT_OFFSET                           *)
00000000 1 (*                                                              *)
00000000 1 (*   PARENTS variant:   MEAS_ [0..n]                             *)
00000000 1 (*                        .OP_CODE                               *)
00000000 1 (*                        .PROC_NUMS [0..14]                     *)
00000000 1 (*                        .STACK_OFFS [0..14]                    *)
00000000 1 (*                                                              *)
00000000 1 (*   PROCS variant:     MEAS_ [0..n]                             *)
00000000 1 (*                        .OP_CODE                               *)
00000000 1 (*                        .ENTRYS [0..8]                         *)
00000000 1 (*                        .EXITS [0..8]                          *)
00000000 1 (*                                                              *)
00000000 1 (*                      SYMS_                                    *)
00000000 1 (*                        .SYMBOL_COUNT                          *)
00000000 1 (*                        .SYMBOL_ARRAY [0..n]                   *)
00000000 1 (*                          .DESCRIP_INDEX                       *)
00000000 1 (*                          .MEAS_SIZE                           *)
00000000 1 (*                                                              *)
00000000 1 (*                      TMA_HOOKS                                *)
00000000 1 (*                        .HOOK_QTY                              *)
00000000 1 (*                        .HOOK [0..n]                           *)
00000000 1 (*                          .VAL                                 *)
00000000 1 (*                          .MSK                                 *)
```

```
00000000 1 (*                    .KIND                                      *)
00000000 1 (*                                                               *)
00000000 1 (*                  FLAGS_ [FLAG_1..FLAG_3]                      *)
00000000 1 (*                                                               *)
00000000 1 (*                  SEXTET_REC                                   *)
00000000 1 (*                   .PC                                         *)
00000000 1 (*                   .ADRS                                       *)
00000000 1 (*                   .COUNT                                      *)
00000000 1 (*                   .DATA                                       *)
00000000 1 (*                   .STATUS                                     *)
00000000 1 (*                   .FLAGS                                      *)
00000000 1 (*                                                               *)
00000000 1 (*-**************************************************************)
00000000 1
00000000 1
00000000 1 $LIST_CODE OFF$
00000000 1 $EXTENSIONS ON$
00000000 1 $TITLE "Soda Dynamic Controller, Trace Modules All"
00000000 1 PROGRAM TRACE_AMOD;
00000000 1
00000000 1
00000000 1 (*****************)
00000000 1 (* INCLUDE FILES *)
00000000 1 (*****************)
00000000 1
00000000 1 #INCLUDE COM_TYPES:SS_DYN
00000000 1 #INCLUDE ER_CONST:SS_DYN
00000000 1 #INCLUDE LD_TYPES:SS_DYN
00000000 1 #INCLUDE UNLD_TYPES:SS_DYN
00000000 1 #INCLUDE FM_TYPES:SS_DYN
00000000 1 #INCLUDE TMA_TYPES:SS_DYN
00000000 1 #INCLUDE ICMD_DATA:SODAMON
00000000 1
00000000 1
00000000 1 (**********************************)
00000000 1 (* SHARED VARIABLES FOR THIS FILE *)
00000000 1 (**********************************)
00000000 1
00000000 1 VAR
00000000 1                                (* Static variables.                 *)
00000000 1   TMA_HOOKS: HOOK_REC_TYPE;    (* Entry and exit hooks.             *)
00000032 1   PREV_HOOK_KIND: S_INT;       (* The kind of hook, PROC_ENTRY or   *)
00000034 1                                (* PROC_EXIT that was in the previous *)
00000034 1                                (* hardware sextet.                  *)
00000034 1   CURRENT_INDENT: S_INT;       (* Current module indentation.       *)
00000036 1
00000036 1                                (* External variables.               *)
00000036 1 $EXTVAR ON$
00000036 1   FOOTDC_INFO: FOOTDC_INFO_TYPE;(* Trace file information.          *)
00000036 1 $EXTVAR OFF$
00000036 1
00000036 1
00000036 1 (**********************************)
00000036 1 (* EXTERNAL PROCEDURES/FUNCTIONS *)
00000036 1 (**********************************)
00000036 1
00000036 1 $CALL_ABS_LONG$
00000000 1
00000000 1 (* Procedure FIX_TM_INDENT keeps track of the current and minimum   *)
00000000 1 (* module indentations for trace modules all.  Provided as a Pascal *)
00000000 1 (* external.                                                         *)
00000000 1
00000000 1 PROCEDURE FIX_TM_INDENT (THIS_ONE: S_INT;  VAR LAST_ONE, MIN_INDENT,
00000000 2                         CUR_INDENT: S_INT);  EXTERNAL;
00000000 1
00000000 1
00000000 1 (* Procedure GET_VALUE_MASK to determine the appropriate value and   *)
00000000 1 (* mask for tracing different processor status, ie reads, writes, etc.*)
00000000 1 (* Provided as a Pascal external.                                    *)
00000000 1
00000000 1 PROCEDURE GET_VALUE_MASK (ACCESS: S_INT;  VAR VALUE, MASK: L_INT);
00000000 2                          EXTERNAL;
00000000 1
00000000 1
```

```
00000000  1  (* Function GET_BUS_MASK to return the processor specific mask        *)
00000000  1  (* containing all 1s for all bits on the given bus.  Provided as a     *)
00000000  1  (* Pascal external.                                                    *)
00000000  1
00000000  1  FUNCTION GET_BUS_MASK (BUS: S_INT): L_INT;  EXTERNAL;
00000000  1
00000000  1
00000000  1  (* Procedure P_ADDR to return the processor specific physical address *)
00000000  1  (* equivalent to the given logical address.  Provided as a Pascal      *)
00000000  1  (* external.                                                           *)
00000000  1
00000000  1  PROCEDURE P_ADDR (LOGICAL_ADDR: L_INT;  VAR PHYSICAL_ADDR: L_INT);
00000000  2                 EXTERNAL;
00000000  1
00000000  1
00000000  1  (* Procedure START_GEN to prepare a function generator for use.       *)
00000000  1  (* Provided as a Pascal external.                                      *)
00000000  1
00000000  1  PROCEDURE START_GEN (VAR GENERATOR: FUNC_RESOURCE;  START_STATE,
00000000  2                      NEXT_STATE: S_INT;  VAR STATE_PTR: STATE_REC_PTR;
00000000  2                      VAR IO_PTR: I_O_REC_PTR;  VAR HIGH_SET:
00000000  2                      HIGH_LEVEL_SET);  EXTERNAL;
00000000  1
00000000  1
00000000  1  (* Function ASSIGN_LL_RSRC to allocate a low level resource from      *)
00000000  1  (* those available for use by the caller.  Provided as a Pascal       *)
00000000  1  (* external.                                                           *)
00000000  1
00000000  1  FUNCTION ASSIGN_LL_RSRC (RSRC_TYPE: LL_TYPE;  RSRC_ID: S_INT;
00000000  2                          LO_VALUE, LO_MASK, HI_VALUE, HI_MASK:
00000000  2                          L_INT;  VAR LL_ARRAY: LL_ARRAY_TYPE): S_INT;
00000002  2                          EXTERNAL;
00000000  1
00000000  1
00000000  1  (* Procedure MERGE_LL_RSRC to merge the signals from the matching     *)
00000000  1  (* portions of a low level resource with the existing signals already *)
00000000  1  (* being received by the given high level resource.  Provided as a    *)
00000000  1  (* Pascal external.                                                    *)
00000000  1
00000000  1  PROCEDURE MERGE_LL_RSRC (RSRC_ID: S_INT;  VAR LL_ARRAY: LL_ARRAY_TYPE;
00000000  2                          VAR HL_RSRC: HL_RESOURCE);  EXTERNAL;
00000000  1
00000000  1
00000000  1  (* Procedure REVERSE_LL_RSRC to reverse the logic polarity of a low    *)
00000000  1  (* level resource.  Proveded as a Pascal external.                     *)
00000000  1
00000000  1  PROCEDURE REVERSE_LL_RSRC (RSRC_ID: S_INT;  VAR LL_ARRAY:
00000000  2                            LL_ARRAY_TYPE);  EXTERNAL;
00000000  1
00000000  1
00000000  1  (* Procedure ADD_OPERAND to "push" an operand onto a function         *)
00000000  1  (* generator input function description.  Provided as a Pascal       *)
00000000  1  (* external.                                                           *)
00000000  1
00000000  1  PROCEDURE ADD_OPERAND (VAR INPUT: CONDITION_REC;  VAR IO: I_O_REC;
00000000  2                       VAR CODE: S_INT);  EXTERNAL;
00000000  1
00000000  1
00000000  1  (* Procedure ADD_OPERATOR to "push" an operator onto a function        *)
00000000  1  (* generator input function description.  Provided as a Pascal        *)
00000000  1  (* external.                                                           *)
00000000  1
00000000  1  PROCEDURE ADD_OPERATOR (INPUT: ENTRY_TYPE;  VAR IO: I_O_REC;
00000000  2                        VAR CODE: S_INT);  EXTERNAL;
00000000  1
00000000  1
00000000  1  (* Function ASSIGN_PATH to allocate the necessary resources to form a *)
00000000  1  (* path from the low level resources to the high level resources.     *)
00000000  1  (* Provided as a Pascal external.                                      *)
00000000  1
00000000  1  FUNCTION ASSIGN_PATH (RSRC_TYPE: LL_TYPE;  PATH_ID: S_INT;
00000000  2                      LO_VALUE, LO_MASK, HI_VALUE, HI_MASK: L_INT;
00000000  2                      VAR POS_HL_SET: HIGH_LEVEL_SET;  VAR LO_ARRAY:
00000000  2                      LL_ARRAY_TYPE;  VAR HI_ARRAY: HL_ARRAY_TYPE):
```

```
00000000  2                      S_INT;  EXTERNAL;
00000000  1
00000000  1
00000000  1  (* Procedure ADD_PATH to create and add a low to high level resource  *)
00000000  1  (* path to the given function generator I/O node's input function      *)
00000000  1  (* description.  Provided as a Pascal external.                        *)
00000000  1
00000000  1  PROCEDURE ADD_PATH (RSRC_TYPE: LL_TYPE;  PATH_ID: S_INT;  LO_VALUE,
00000000  2                      LO_MASK, HI_VALUE, HI_MASK: L_INT;  VAR
00000000  2                      POS_HL_SET: HIGH_LEVEL_SET;  VAR LO_ARRAY:
00000000  2                      LL_ARRAY_TYPE;  VAR HI_ARRAY: HL_ARRAY_TYPE;
00000000  2                      VAR IO: I_O_REC;  VAR CODE: S_INT);  EXTERNAL;
00000000  1
00000000  1
00000000  1  (* Procedure CLOSE_IO_NODE to close out a function generator I/O       *)
00000000  1  (* node.  Provided as a Pascal external.                               *)
00000000  1
00000000  1  PROCEDURE CLOSE_IO_NODE (FINAL_OUTS: OUT_SET_TYPE;  VAR IO: I_O_REC;
00000000  2                           VAR CLOSE_CODE: S_INT);  EXTERNAL;
00000000  1
00000000  1
00000000  1  (* Procedure CLOSE_IO_LIST to close out a function generator I/O list *)
00000000  1  (* with a don't care I/O node.  Provided as a Pascal external.        *)
00000000  1
00000000  1  PROCEDURE CLOSE_IO_LIST (DC_STATE: S_INT;  DC_OUTS: OUT_SET_TYPE;
00000000  2                           VAR LAST_IO: I_O_REC);  EXTERNAL;
00000000  1
00000000  1
00000000  1  (* Procedure HOW_MUCH_DATA to determine how much data was captured     *)
00000000  1  (* and starting from where.  Provided as a Pascal external.            *)
00000000  1
00000000  1  PROCEDURE HOW_MUCH_DATA (VAR FLAGS: FLAG_ARRAY_TYPE; VAR FEAT_ARRAY:
00000000  2                           FEAT_ARRAY_TYPE; START_MAC, END_MAC:  S_INT;
00000000  2                           VAR START_STATE, NUM_STATES: S_INT);
00000000  2                           EXTERNAL;
00000000  1
00000000  1
00000000  1  (* Procedure GET_DATA to retrieve a sextet worth of data out of        *)
00000000  1  (* acquisition memory, translate processor status into generic status,*)
00000000  1  (* and decode the captured grey-code count.  Provided as a Pascal      *)
00000000  1  (* external.                                                           *)
00000000  1
00000000  1  PROCEDURE GET_DATA (START_STATE, UN_COUNTER: S_INT;  VAR FEAT_ARRAY:
00000000  2                      FEAT_ARRAY_TYPE;  VAR BASE: DOUBLE_ARRAY;
00000000  2                      VAR SEXTET: SEXTET_REC_TYPE);  EXTERNAL;
00000000  1
00000000  1
00000000  1  (* Procedure WRITE_ANLYS_REC to create and write a trace file          *)
00000000  1  (* analysis record to the disc.  Provided as a Pascal external.        *)
00000000  1
00000000  1  PROCEDURE WRITE_ANLYS_REC (D_TYPE, INDEX: S_INT;  M_FIELD: L_INT;  VAR
00000000  2                             SEX_REC: SEXTET_REC_TYPE; VAR REC_COUNT,
00000000  2                             FMGR_CODE: S_INT);  EXTERNAL;
00000000  1
00000000  1
00000000  1  (* Function UNLOAD_DONE to determine when the unload sequence is done.*)
00000000  1  (* Provided as a Pascal external.                                      *)
00000000  1
00000000  1  FUNCTION UNLOAD_DONE (COUNT: S_INT): BOOLEAN;  EXTERNAL;
00000000  1
00000000  1
00000000  1  (* Procedure UNLOAD_MSG to update the current unload message with the *)
00000000  1  (* given count.  Provided as a Pascal external.                        *)
00000000  1
00000000  1  PROCEDURE UNLOAD_MSG (STATE: S_INT);  EXTERNAL;
00000000  1
00000000  1
00000000  1  (* Function MASK_BITS performs a bit-wise masking of a value based on *)
00000000  1  (* a mask.  VALUE is simply bit-wise ANDed with MASK and the result   *)
00000000  1  (* returned.  Provided as an assembly language external.              *)
00000000  1
00000000  1  FUNCTION MASK_BITS (MASK, VALUE: L_INT): L_INT;  EXTERNAL;
00000000  1
00000000  1
```

```
00000000 1 (* Function MATCH_BITS compares two masked values for equality and   *)
00000000 1 (* returns true if they match.   Provided as an assembly language     *)
00000000 1 (* external.                                                           *)
00000000 1
00000000 1 FUNCTION MATCH_BITS (VALUE1, VALUE2, MASK: S_INT): BOOLEAN;  EXTERNAL;
00000000 1
00000000 1
00000000 1 $CALL_PC_SHORTS
00000000 1
00000000 1 (* Procedure GET_TMA_HOOKS assigns the processor specific, procedure *)
00000000 1 (* entry and exit hook constants to record TMA_HOOKS.  Provided as a *)
00000000 1 (* Pascal external.                                                  *)
00000000 1
00000000 1 PROCEDURE GET_TMA_HOOKS (VAR TMA_HOOKS: HOOK_REC_TYPE);  EXTERNAL;
00000000 1
00000000 1
00000000 1 (* Procedure TMA_FILTER determines whether or not the hardware sextet *)
00000000 1 (* passed to it is a legitimate entry or exit.  This processor      *)
00000000 1 (* dependent procedure may also modify a field in the sextet if it   *)
00000000 1 (* is determined to be garbage, such as the PC field.  Provided as a  *)
00000000 1 (* Pascal external.                                                  *)
00000000 1
00000000 1 PROCEDURE TMA_FILTER (VAR SEXTET_REC: SEXTET_REC_TYPE;
00000000 2                       HOOK_KIND: S_INT; HOOK_OFFSET: L_INT;
00000000 2                       VAR PASSED_FILTER: BOOLEAN);  EXTERNAL;
00000000 1
00000000 1
00000000 1
00000000 1 (*********************************************************************)
00000000 1 (*************************** CLASSIFY_HOOK ****************************)
00000000 1 (*********************************************************************)
00000000 1 (* VAR Parameters:                                                   *)
00000000 1 (*   TMA_HOOKS      Input - Structure containing the processor      *)
00000000 1 (*                    specific hooks to compare against.             *)
00000000 1 (*                                                                   *)
00000000 1 (* Value Parameters:                                                 *)
00000000 1 (*   CAPTURED_DATA  Input - Data field of the sextet unloaded from   *)
00000000 1 (*                   the hardware.  We are trying to classify this   *)
00000000 1 (*                   data pattern.                                   *)
00000000 1 (*                                                                   *)
00000000 1 (* Function Returns:  The kind of hook; PROC_ENTRY, PROC_EXIT, or     *)
00000000 1 (*                   GARBAGE if hook is not found.                   *)
00000000 1 (*                                                                   *)
00000000 1 (*********************************************************************)
00000000 1 (* Procedures called by CLASSIFY_HOOK: None                           *)
00000000 1 (*                                                                   *)
00000000 1 (* Functions called by CLASSIFY_HOOK:  MATCH_BITS                     *)
00000000 1 (*                                                                   *)
00000000 1 (*********************************************************************)
00000000 1 (* Function CLASSIFY_HOOK searches TMA_HOOKS, comparing the processor *)
00000000 1 (* specific hooks contained there against CAPTURED_DATA.  When it     *)
00000000 1 (* finds a match CLASSIFY_HOOK returns whether it found a PROC ENTRY  *)
00000000 1 (* or a PROC_EXIT type of hook.  If CLASSIFY_HOOK is not able find a  *)
00000000 1 (* match for CAPTURED_DATA it returns GARBAGE.                        *)
00000000 1 (*-*******************************************************************)
00000000 1
00000000 1 FUNCTION CLASSIFY_HOOK (CAPTURED_DATA: S_INT; TMA_HOOKS: HOOK_REC_TYPE):
00000000 2                          S_INT;
00000002 2 VAR
00000002 2   I: S_INT;                        (* Loop counter.                   *)
00000004 2   FOUND_HOOK: BOOLEAN;             (* Flag indicating hook was found.  *)
00000014 2
00000014 2 BEGIN
00000014 2   I := 0;                          (* Initialize variables.            *)
00000018 2   FOUND_HOOK := FALSE;
0000001C 2
0000001C 2   WHILE (NOT FOUND_HOOK) AND (I < TMA_HOOKS.HOOK_QTY) DO
00000038 2                (* Search for the hook until we have found it or we   *)
00000038 2     BEGIN      (* run out of possible hooks.                          *)
00000038 2       FOUND_HOOK := MATCH_BITS (CAPTURED_DATA, TMA_HOOKS.HOOK[I].VAL,
00000038 2                                 TMA_HOOKS.HOOK[I].MSK);
0000006C 2                                (* Check for a match.                 *)
0000006C 2       I := I + 1                 (* Go on to next hook.                *)
00000070 2     END;
```

```
00000072  2
00000072  2    IF FOUND_HOOK                   (* Did we find the hook?             *)
0000007A  2    THEN                            (* Yes, so get what kind it is.      *)
0000007A  2      CLASSIFY_HOOK := TMA_HOOKS.HOOK[I-1].KIND
0000009A  2    ELSE                            (* No.                               *)
0000009A  2      CLASSIFY_HOOK := GARBAGE;
000000A0  2  END;                              (* End of function CLASSIFY_HOOK.    *)
00000000  1
00000000  1
00000000  1  (***********************************************************************)
00000000  1  (*************************** GET_HOOK_OFFSET ****************************)
00000000  1  (***********************************************************************)
00000000  1  (* VAR Parameters:                                                      *)
00000000  1  (*   OFFSET          Output - Offset between CAPTURED_ADDR and the      *)
00000000  1  (*                     procedure entry address if it is an entry hook, *)
00000000  1  (*                     and the procedure exit address if it is an exit *)
00000000  1  (*                     hook.                                            *)
00000000  1  (*                                                                      *)
00000000  1  (*   OK_FLAG         Output - Flag indicating if OFFSET contains        *)
00000000  1  (*                     an offset value.  If the procedure search is     *)
00000000  1  (*                     unsuccessful this flag will be false.            *)
00000000  1  (*                                                                      *)
00000000  1  (*   MEAS_           Input - The measurement sturcture that contains    *)
00000000  1  (*                     the procedure entry and exit addresses of        *)
00000000  1  (*                     those procedures included in the measurement.    *)
00000000  1  (*                     These addresses may be in both the "PROC_OP"     *)
00000000  1  (*                     variant and the "PROCS" variant of MEAS_,        *)
00000000  1  (*                     depending on how the measurement was specified. *)
00000000  1  (*                                                                      *)
00000000  1  (*   SYMS_           Input - A list of the user supplied symbols        *)
00000000  1  (*                     files and/or procedures).  This helps in         *)
00000000  1  (*                     searching MEAS_.                                 *)
00000000  1  (*                                                                      *)
00000000  1  (* Value Parameters:                                                    *)
00000000  1  (*   CAPTURED_ADDR  Input - Address field of the sextet unloaded from *)
00000000  1  (*                     the hardware.  We are trying to find the         *)
00000000  1  (*                     procedure this address belongs to and get the    *)
00000000  1  (*                     offset between this address and the procedure    *)
00000000  1  (*                     entry or exit address.                           *)
00000000  1  (*                                                                      *)
00000000  1  (*   KIND_OF_HOOK   Input - The kind of hook CAPTURED_ADDR is:          *)
00000000  1  (*                     PROC_ENTRY versus PROC_EXIT.                     *)
00000000  1  (*                                                                      *)
00000000  1  (***********************************************************************)
00000000  1  (* Procedures called by GET_HOOK_OFFSET:  P_ADDR                        *)
00000000  1  (*                                                                      *)
00000000  1  (* Functions called by GET_HOOK_OFFSET: None                            *)
00000000  1  (*                                                                      *)
00000000  1  (***********************************************************************)
00000000  1  (* Procedure GET_HOOK_OFFSET gets the offset of CAPTURED_ADDR            *)
00000000  1  (* relative to the entry or exit address of the procedure for which     *)
00000000  1  (* the address in CAPTURED_ADDR belongs.  GET_HOOK_OFFSET first         *)
00000000  1  (* must find the procedure where the address in CAPTURED_ADDR belongs.*)
00000000  1  (* SYMS_ is used to find which symbol, either procedure or file,         *)
00000000  1  (* the user specified that owns the captured address.   Then MEAS_      *)
00000000  1  (* is checked to determine if the symbol is a procedure or a file.      *)
00000000  1  (* If the symbol is a procedure we need                                  *)
00000000  1  (* go no further to get the offset.  The entry or exit address          *)
00000000  1  (* used to calculate the offset is extracted from the "PROC_OP"         *)
00000000  1  (* record of MEAS_.  If the symbol is a file we need to search the      *)
00000000  1  (* following "PROCS" type record(s), looking for the                    *)
00000000  1  (* procedure.  If this search is unsuccessful OK_FLAG will be           *)
00000000  1  (* returned false although this should never happen.                    *)
00000000  1  (* OK_FLAG will be returned false if the search of SYMS_ is              *)
00000000  1  (* unsuccessful; which may happen if the hardware stores an entry or    *)
00000000  1  (* exit hook for a procedure that was not specified in the              *)
00000000  1  (* measurement.                                                         *)
00000000  1  (* Entry hook offsets should be greater or equal to zero while exit     *)
00000000  1  (* hook offsets should be less than or equal to zero.                   *)
00000000  1  (***********************************************************************)
00000000  1
00000000  1  PROCEDURE GET_HOOK_OFFSET (CAPTURED_ADDR: L_INT; KIND_OF_HOOK: S_INT;
00000000  2                            VAR MEAS_: CMD_DATA_ARRAY;
00000000  2                            VAR SYMS_: SYM_DESCRIPS; VAR OFFSET: L_INT;
```

```
00000000  2                              VAR OK_FLAG: BOOLEAN);
00000000  2
00000000  2  VAR
00000000  2    I: S_INT;                    (* Loop counter.                       *)
00000002  2    M_INDEX: S_INT;              (* Index into the measurement          *)
00000004  2                                 (* structure MEAS_.                    *)
00000004  2    P_INDEX: S_INT;              (* Index into the entry and exit       *)
00000006  2                                 (* arrays of the "PROCS" variant of    *)
00000006  2                                 (* MEAS_.                              *)
00000006  2    PHYSICAL_ENTRY: L_INT;       (* Physical entry address.             *)
0000000A  2    PHYSICAL_EXIT: L_INT;        (* Physical exit address.              *)
0000000E  2    FOUND_FLAG: BOOLEAN;         (* Flag indicating a symbol matching   *)
000000AE  2                                 (* the captured address was found.     *)
000000AE  2
000000AE  2  BEGIN
000000AE  2
000000AE  2    I := 0;                      (* Initialize variables.               *)
000000B2  2    FOUND_FLAG := FALSE;
000000B6  2    OK_FLAG := FALSE;
000000BC  2
000000BC  2    WHILE (NOT FOUND_FLAG) AND (I < SYMS_.SYMBOL_COUNT) DO
000000DA  2              (* Go thru the list of user supplied symbols.              *)
000000DA  2      BEGIN
000000DA  2        M_INDEX := SYMS_.SYMBOL_ARRAY[I].DESCRIP_INDEX;
000000EC  2              (* Get the index into the measurement structure.          *)
000000EC  2
000000EC  2        P_ADDR (MEAS_[M_INDEX].ADDRESS, PHYSICAL_ENTRY);
0000010C  2              (* Translate logical address to physical address.         *)
0000010C  2
0000010C  2        IF (CAPTURED_ADDR >= PHYSICAL_ENTRY) AND
0000010C  2          (CAPTURED_ADDR < (PHYSICAL_ENTRY + MEAS_[M_INDEX].SIZE))
00000140  2              (* Does the current symbol being looked at include         *)
00000140  2              (* the address from the hardware sextet?                   *)
00000140  2        THEN                     (* Yes.                                *)
00000140  2          BEGIN
00000140  2            FOUND_FLAG := TRUE;  (* Indicate symbol was found.          *)
00000146  2
00000146  2            IF MEAS_[M_INDEX].OP_CODE = FILE_OP
0000015A  2                                 (* Is the current record in MEAS_ a    *)
0000015A  2                                 (* "FILE_OP" type record?              *)
0000015A  2            THEN                 (* Yes, this is a "file" symbol.       *)
0000015A  2              BEGIN              (* Search the "PROCS" record(s).       *)
0000015A  2                M_INDEX := M_INDEX + 1;
0000015E  2                                 (* Start with the next "PROCS" record.*)
0000015E  2                P_INDEX := 0;    (* Start with the first entry/exit     *)
00000162  2                                 (* pair of the "PROCS" record.         *)
00000162  2                WHILE (NOT OK_FLAG) AND (MEAS_[M_INDEX].OP_CODE = PROCS)
00000162  2                      AND (MEAS_[M_INDEX].ENTRYS[P_INDEX] <> -1) DO
000001B4  2                  (* Search for the procedure that includes the             *)
000001B4  2                  (* address from the hardware sextet.  Look for a -1       *)
000001B4  2                  (* terminator or a the wrong type of record to tell       *)
000001B4  2                  (* us we should abort our search.                          *)
000001B4  2                  BEGIN
000001B4  2                    P_ADDR (MEAS_[M_INDEX].ENTRYS[P_INDEX],
000001B4  2                            PHYSICAL_ENTRY);
000001DA  2                                 (* Translate logical entry address to *)
000001DA  2                                 (* physical entry address.             *)
000001DA  2
000001DA  2                    P_ADDR (MEAS_[M_INDEX].EXITS[P_INDEX], PHYSICAL_EXIT);
00000204  2                                 (* Translate logical exit address to  *)
00000204  2                                 (* physical exit address.              *)
00000204  2
00000204  2                    IF (CAPTURED_ADDR >= PHYSICAL_ENTRY) AND
00000204  2                       (CAPTURED_ADDR <= PHYSICAL_EXIT)
00000222  2                                 (* Have we have found the procedure   *)
00000222  2                                 (* that contains the captured address?*)
00000222  2                    THEN         (* Yes.                                *)
00000222  2                      OK_FLAG := TRUE
0000022E  2                                 (* Expect that OFFSET will be valid.  *)
0000022E  2                    ELSE         (* No, so continue search.             *)
0000022E  2                      BEGIN
0000022E  2                        P_INDEX := P_INDEX + 1;
00000232  2                                 (* Go on to the next entry/exit in    *)
00000232  2                                 (* "PROCS" record.                     *)
```

```
00000232  2                      IF P_INDEX = 9
0000023E  2                                   (* Have we hit the end of the           *)
0000023E  2                                   (* current "PROCS" record?              *)
0000023E  2                      THEN         (* Yes, so go on to the next record.    *)
0000023E  2                        BEGIN
0000023E  2                          N_INDEX := N_INDEX + 1;
00000242  2                          P_INDEX := 0
00000246  2                        END
00000246  2                    END
00000246  2                  END;
0000024A  2
0000024A  2                IF OK_FLAG
00000254  2                THEN               (* Continue only if we found the proc.*)
00000254  2                  CASE KIND_OF_HOOK OF
0000025E  2                                   (* Determine the kind of hook.          *)
0000025E  2                    PROC_ENTRY:    (* Handle an entry hook.                *)
0000025E  2                      OFFSET := CAPTURED_ADDR - PHYSICAL_ENTRY;
00000270  2
00000270  2                    PROC_EXIT:     (* Handle an exit hook.                 *)
00000270  2                      OFFSET := CAPTURED_ADDR - PHYSICAL_EXIT;
00000282  2
00000282  2                    OTHERWISE      (* Got passed garbage so bail out.      *)
00000282  2                      OK_FLAG := FALSE
00000288  2                  END
000002AC  2              END
000002B0  2
000002B0  2            ELSE                   (* No, this is a "procedure" symbol.    *)
000002B0  2              BEGIN
000002B0  2                OK_FLAG := TRUE;   (* Expect that OFFSET will be valid.    *)
000002B8  2
000002B8  2                CASE KIND_OF_HOOK OF
000002C2  2                                   (* Determine the kind of hook.          *)
000002C2  2                  PROC_ENTRY:      (* Handle an entry hook.                *)
000002C2  2                    BEGIN
000002C2  2                      P_ADDR (MEAS_[M_INDEX].ENTRY, PHYSICAL_ENTRY);
000002E2  2                                   (* Translate logical entry address to   *)
000002E2  2                                   (* physical entry address.              *)
000002E2  2                      OFFSET := CAPTURED_ADDR - PHYSICAL_ENTRY
000002F0  2                    END;
000002F4  2
000002F4  2                  PROC_EXIT:       (* Handle an exit hook.                 *)
000002F4  2                    BEGIN
000002F4  2                      P_ADDR (MEAS_[M_INDEX].EXIT, PHYSICAL_EXIT);
00000314  2                                   (* Translate logical exit address to    *)
00000314  2                                   (* physical exit address.               *)
00000314  2                      OFFSET := CAPTURED_ADDR - PHYSICAL_EXIT
00000322  2                    END;
00000326  2
00000326  2                  OTHERWISE        (* Got passed garbage so bail out.      *)
00000326  2                    OK_FLAG := FALSE
0000032C  2                END
00000350  2              END
00000350  2            END;
00000350  2
00000350  2        I := I + 1                 (* go on to next symbol.                *)
00000354  2      END
00000358  2  END;                             (* End of procedure GET_HOOK_OFFSET.    *)
00000000  1
00000000  1
00000000  1
00000000  1  $GLOBPROC ON$
00000000  1
00000000  1  (*************************************************************************)
00000000  1  (****************************** LOAD_TMA *********************************)
00000000  1  (*************************************************************************)
00000000  1  (* VAR Parameters:                                                       *)
00000000  1  (*    MEAS_      Input - The structure to the loader indicating what     *)
00000000  1  (*                 the measurement is and what the user supplied parts   *)
00000000  1  (*                 of the measurement are.                               *)
00000000  1  (*                                                                       *)
00000000  1  (*    SYMS_      Input - A list of the user supplied symbols (files      *)
00000000  1  (*                 and/or procedures).  This does not directly list      *)
00000000  1  (*                 the procedures contained within a specified file.     *)
00000000  1  (*                                                                       *)
```

```
00000000  1  (*   SPEC        Input - The initialized hardware specification         *)
00000000  1  (*                 structure.                                            *)
00000000  1  (*               Output - The completed hardware specification to       *)
00000000  1  (*                 perform a trace modules all.                          *)
00000000  1  (*                                                                       *)
00000000  1  (*   R_CODE      Output - A code indicating how the load turned out.    *)
00000000  1  (*                 -6 indicates translation error; function              *)
00000000  1  (*                    description overflow.                              *)
00000000  1  (*                 -4 indicates out of high level hardware resources.    *)
00000000  1  (*                 -3 indicates out of low level hardware resources.     *)
00000000  1  (*                  0 indicates no error; load completed.                *)
00000000  1  (*                                                                       *)
00000000  1  (* Value Parameters:  None                                               *)
00000000  1  (*                                                                       *)
00000000  1  (************************************************************************)
00000000  1  (* Procedures called by LOAD_TMA:                                        *)
00000000  1  (*                              GET_TMA_HOOKS                            *)
00000000  1  (*                              GET_VALUE_MASK                           *)
00000000  1  (*                              P_ADDR                                   *)
00000000  1  (*                              START_GEN                                *)
00000000  1  (*                              MERGE_LL_RSRC                            *)
00000000  1  (*                              REVERSE_LL_RSRC                          *)
00000000  1  (*                              ADD_OPERAND                              *)
00000000  1  (*                              ADD_OPERATOR                             *)
00000000  1  (*                              ADD_PATH                                 *)
00000000  1  (*                              CLOSE_IO_NODE                            *)
00000000  1  (*                              CLOSE_IO_LIST                            *)
00000000  1  (*                                                                       *)
00000000  1  (* Functions called by LOAD_TMA:                                         *)
00000000  1  (*                              GET_BUS_MASK                             *)
00000000  1  (*                              ASSIGN_LL_RSRC                           *)
00000000  1  (*                              ASSIGN_PATH                              *)
00000000  1  (*                                                                       *)
00000000  1  (************************************************************************)
00000000  1  (* Procedure LOAD_TMA is the pre-processor for the trace modules all    *)
00000000  1  (* measurement.  It loads the appropiate data structures with the       *)
00000000  1  (* necessary information to create a trace modules all measurement      *)
00000000  1  (* when loaded into the hardware.                                        *)
00000000  1  (*-**********************************************************************)
00000000  1
00000000  1  PROCEDURE LOAD_TMA (VAR MEAS_: CMD_DATA_ARRAY; VAR SYMS_: SYM_DESCRIPS;
00000000  2                     VAR SPEC: HW_SPEC_REC; VAR R_CODE: S_INT);
00000000  2
00000000  2  VAR
00000000  2    OP_VALUE: L_INT;              (* Processor value for opcode fetch.  *)
00000004  2    OP_MASK: L_INT;               (* Processor mask for opcode fetch.   *)
00000008  2    ADDR_MASK: L_INT;             (* Processor valid address bits.      *)
0000000C  2
0000000C  2    NEXT_LL: S_INT;               (* Next assigned low-level resource.  *)
0000000E  2    NEXT_HL: S_INT;               (* Next assigned high-level resource. *)
00000010  2    ID: S_INT;                    (* Currently available unused ID.     *)
00000012  2    I: S_INT;                     (* Loop counter.                      *)
00000014  2    ADDR_RANGE_QTY: S_INT;        (* Number of address ranges that need *)
00000016  2                                  (* to be "ORed" together.             *)
00000016  2
00000016  2    STATE_PTR: STATE_REC_PTR;     (* Pointer to current function        *)
0000001A  2                                  (* generator state node.              *)
0000001A  2    IO_PTR: I_O_REC_PTR;          (* Pointer to current function        *)
0000001E  2                                  (* input/output node.                 *)
0000001E  2
0000001E  2    HL_SET: HIGH_LEVEL_SET;       (* Current set of useable high level  *)
00000020  2                                  (* resources.                         *)
00000020  2
00000020  2    RG_LOWER_VAL: L_INT;          (* Current address range lower value. *)
00000024  2    RG_UPPER_VAL: L_INT;          (* Current address range upper value. *)
00000360  2
00000360  2
00000360  2  BEGIN
00000360  2
00000360  2    R_CODE := NO_ERROR;           (* No error to start with.            *)
00000366  2
00000366  2  (* Initialize variables for post-processor here because                 *)
00000366  2  (* post-processor may be called more than once.                          *)
00000366  2
```

```
00000366  2     CURRENT_INDENT := 0;
0000036A  2     PREV_HOOK_KIND := GARBAGE;     (* Initially no previous entry/exit.  *)
00000370  2
00000370  2   (* Now continue with pre-processor work.                                *)
00000370  2
00000370  2     GET_TMA_HOOKS (TMA_HOOKS);     (* Get the processor specific hooks   *)
0000037A  2                                    (* and perform any processor specific *)
0000037A  2                                    (* initialization.                    *)
0000037A  2
0000037A  2     ID := 1;                       (* Initialize available ID number.    *)
00000380  2
00000380  2     START_GEN (SPEC.FUNC_GENERATORS[Y], 0, 0, STATE_PTR, IO_PTR, HL_SET);
000003A8  2                  (* Start state machine using the Y generator.           *)
000003A8  2                  (* START_STATE and NEXT_STATE both 0.                   *)
000003A8  2
000003A8  2     GET_VALUE_MASK (OPCODE, OP_VALUE, OP_MASK);
000003C0  2                                    (* Get processor specific opcode      *)
000003C0  2                                    (* value/mask and valid address bits. *)
000003C0  2
000003C0  2     ADDR_MASK := GET_BUS_MASK (0);
000003CE  2                  (* Get processor specific address bus mask.             *)
000003CE  2
000003CE  2     NEXT_LL := ASSIGN_LL_RSRC (OPCODE_EQUATE, 999, OP_VALUE + ADDR_MASK,
000003CE  2                                OP_MASK, 0, 0, SPEC.LOW_LEVELS);
000003FE  2                  (* Set up opcode fetch with a don't care address.       *)
000003FE  2
000003FE  2
000003FE  2   (* Using the symbol array find and set-up the various address ranges    *)
000003FE  2   (* of the files/procedures entered by the user.  Combine ranges for     *)
000003FE  2   (* adjacent files/procedures to conserve hardware resources.            *)
000003FE  2
000003FE  2     I := 0;
00000402  2     ADDR_RANGE_QTY := 0;
00000406  2
00000406  2     WHILE (I < SYMS_.SYMBOL_COUNT) AND (R_CODE = NO_ERROR) DO
00000428  2       BEGIN
00000428  2         IF SYMS_.SYMBOL_ARRAY[I].MEAS_SIZE <> 0
00000440  2                  (* Is this symbol included by another symbol ?          *)
00000440  2         THEN     (* No, so set up an address range for it.               *)
00000440  2           BEGIN
00000440  2             WITH MEAS_[SYMS_.SYMBOL_ARRAY[I].DESCRIP_INDEX] DO
00000460  2               P_ADDR (ADDRESS, RG_LOWER_VAL);
00000470  2                  (* Translate logical address to physical address.       *)
00000470  2
00000470  2             RG_UPPER_VAL := RG_LOWER_VAL + SYMS_.SYMBOL_ARRAY[I].MEAS_SIZE
00000470  2                             - 1;  (* Calculate upper bound of range.     *)
00000492  2
00000492  2             ADD_PATH (ADDRESS_RANGE, ID, OP_VALUE+RG_LOWER_VAL,
00000492  2                       OP_MASK+ADDR_MASK, OP_VALUE+RG_UPPER_VAL,
00000492  2                       OP_MASK+ADDR_MASK, HL_SET, SPEC.LOW_LEVELS,
00000492  2                       SPEC.HIGH_LEVELS, IO_PTR^, R_CODE);
000004EA  2                  (* Allocate an address range and connect it to a        *)
000004EA  2                  (* high-level resource.                                 *)
000004EA  2
000004EA  2             ID := ID + 1;          (* Get next unused ID.                *)
000004EE  2
000004EE  2             ADDR_RANGE_QTY := ADDR_RANGE_QTY + 1
000004F2  2                  (* Keep track of how many address ranges are used.      *)
000004F2  2           END;
000004F2  2         I := I + 1                 (* Go on to next symbol.              *)
000004F6  2       END;
000004FA  2
000004FA  2
000004FA  2   (* Now "OR" together the address ranges allocated above by pushing      *)
000004FA  2   (* the needed "OR" operator(s) onto the function description.           *)
000004FA  2
000004FA  2     I := 2;        (* Require at least two ranges to need an operator.   *)
00000500  2     WHILE (I <= ADDR_RANGE_QTY) AND (R_CODE = NO_ERROR) DO
00000520  2       BEGIN
00000520  2         ADD_OPERATOR (OR_, IO_PTR^, R_CODE);
0000053C  2         I := I + 1
00000540  2       END;
00000542  2
00000542  2
```

```
00000542  2  (* Using the entry and exit hook data patterns allocate the necessary *)
00000542  2  (* data equate resources, and connect the data resources together     *)
00000542  2  (* into one high-level resource.  To "OR" the low-level data equate   *)
00000542  2  (* resources together, each resource, after it is allocated, has its  *)
00000542  2  (* output polarity reversed.  All these "inverted" data equate         *)
00000542  2  (* resources are then "ANDed" together by merging them into one high- *)
00000542  2  (* level rsources.  The "NOT" of the high level resource will be used *)
00000542  2  (* by the function generator.                                          *)
00000542  2
00000542  2    IF (TMA_HOOKS.HOOK_QTY > 0) AND (R_CODE = NO_ERROR)
0000055E  2    THEN
0000055E  2      BEGIN                          (* Set up the first hook.             *)
0000055E  2
0000055E  2        NEXT_HL := ASSIGN_PATH (DATA_EQUATE, ID,
0000055E  2                               L_INT(TMA_HOOKS.HOOK[0].VAL),
0000055E  2                               L_INT(TMA_HOOKS.HOOK[0].MSK), 0, 0,
0000055E  2                               HL_SET, SPEC.LOW_LEVELS,
0000055E  2                               SPEC.HIGH_LEVELS);
0000059E  2                (* Allocate the first low-level data equate resource  *)
0000059E  2                (* and tie it to a newly allocated high-level         *)
0000059E  2                (* resource.                                          *)
0000059E  2
0000059E  2        IF NEXT_HL >= 0              (* Were we able to get both a low-     *)
000005A6  2                                     (* level and a high-level resource?    *)
000005A6  2        THEN                         (* Yes.                                *)
000005A6  2          BEGIN
000005A6  2            REVERSE_LL_RSRC (ID, SPEC.LOW_LEVELS);
000005B8  2                (* Invert output polarity of the data equate resource.*)
000005B8  2
000005B8  2            ADD_OPERAND (SPEC.HIGH_LEVELS [NEXT_HL].HL_OUTPUT,
000005B8  2                         IO_PTR^, R_CODE)
000005E8  2                (* Add high-level resource term to input function.    *)
000005E8  2          END
000005EC  2
000005EC  2        ELSE                         (* No, cannot get a resource.          *)
000005EC  2          R_CODE := NEXT_HL;         (* So update error code.               *)
000005F4  2
000005F4  2        ID := ID + 1                 (* Get next unused ID.                 *)
000005F8  2      END;
000005F8  2
000005F8  2
000005F8  2    I := 1;                          (* Continue with the second hook.      *)
000005FE  2    WHILE (I < TMA_HOOKS.HOOK_QTY) AND (R_CODE = NO_ERROR) DO
0000061E  2      BEGIN
0000061E  2        NEXT_LL := ASSIGN_LL_RSRC (DATA_EQUATE, ID,
0000061E  2                                  L_INT(TMA_HOOKS.HOOK[I].VAL),
0000061E  2                                  L_INT(TMA_HOOKS.HOOK[I].MSK), 0, 0,
0000061E  2                                  SPEC.LOW_LEVELS);
00000662  2                (* Allocate a low-level data equate resource.         *)
00000662  2
00000662  2        IF NEXT_LL >= 0              (* Did we get a low-level resource?    *)
0000066A  2        THEN                         (* Yes.                                *)
0000066A  2          BEGIN
0000066A  2            REVERSE_LL_RSRC (ID, SPEC.LOW_LEVELS);
0000067C  2                (* Invert output polarity of the data equate resource.*)
0000067C  2
0000067C  2            MERGE_LL_RSRC (ID, SPEC.LOW_LEVELS;
0000067C  2                           SPEC.HIGH_LEVELS [NEXT_HL]);
000006A6  2                (* Invert output polarity of the data equate resource.*)
000006A6  2
000006A6  2            ID := ID + 1             (* Get next unused ID.                 *)
000006AA  2          END
000006AE  2
000006AE  2        ELSE                         (* No, cannot get a resource.          *)
000006AE  2          R_CODE := NEXT_LL;         (* So update error code.               *)
000006B6  2
000006B6  2        I := I + 1                   (* Go on to next hook.                 *)
000006BA  2      END;
000006BE  2
000006BE  2
000006BE  2  (* Now "AND" together the "NOT" of the high-level resource allocated  *)
000006BE  2  (* for the entry/exit hooks, with the address range term.  The        *)
000006BE  2  (* address range term is the "OR" of all the address range high-level *)
000006BE  2  (* resources.                                                          *)
```

```
000006BE  2
000006BE  2    IF R_CODE = NO_ERROR
000006C8  2    THEN          (* Use the "NOT" of the last high-level resource.    *)
000006C8  2      ADD_OPERATOR (NOT_, IO_PTR^, R_CODE);
000006E4  2
000006E4  2    IF R_CODE = NO_ERROR
000006EE  2    THEN                        (* Push the "AND" operator.           *)
000006EE  2      ADD_OPERATOR (AND_, IO_PTR^, R_CODE);
0000070A  2
0000070A  2
0000070A  2  (* Close out the Y generator if all went well.  Have STORE output    *)
0000070A  2  (* depend on the the function just built; have COUNT output always   *)
0000070A  2  (* true.                                                             *)
0000070A  2
0000070A  2    IF R_CODE = NO_ERROR
00000714  2    THEN
00000714  2      BEGIN
00000714  2        CLOSE_IO_NODE ([STORE, COUNT], IO_PTR^, R_CODE);
00000730  2               (* STORE and COUNT outputs true when function is true.*)
00000730  2        CLOSE_IO_LIST (0, [COUNT], IO_PTR^)
00000744  2               (* COUNT output also true when function is false.    *)
00000744  2      END
00000744  2
00000744  2  END;                          (* End of procedure LOAD_TMA.          *)
00000000  1
00000000  1
00000000  1
00000000  1  (*********************************************************************)
00000000  1  (**************************** UNLOAD_TMA *****************************)
00000000  1  (*********************************************************************)
00000000  1  (* VAR Parameters:                                                    *)
00000000  1  (*   MEAS_      Input - The structure to the unloader containing      *)
00000000  1  (*                database information used for classifying and       *)
00000000  1  (*                filtering the measurement data.                     *)
00000000  1  (*                                                                    *)
00000000  1  (*   SYMS_      Input - A list of the user supplied symbols (files    *)
00000000  1  (*                and/or procedures).  This does not directly list    *)
00000000  1  (*                the procedures contained within a specified file.   *)
00000000  1  (*                                                                    *)
00000000  1  (*   FLAGS_     Input - The flag word data structure containing the   *)
00000000  1  (*                most recently read hardware flags.                  *)
00000000  1  (*                                                                    *)
00000000  1  (*   MAC_       Input - The Memory Address Counter value off the      *)
00000000  1  (*                CPU board before unloading began.                   *)
00000000  1  (*                                                                    *)
00000000  1  (*   SPEC       Input - The hardware specification which captured the *)
00000000  1  (*                data.                                               *)
00000000  1  (*                                                                    *)
00000000  1  (*   UNLD_COUNT Input - The previous number of states unloaded and    *)
00000000  1  (*                shipped out to the trace file.                      *)
00000000  1  (*              Output - The updated number of states unloaded and    *)
00000000  1  (*                shipped out to the trace file.                      *)
00000000  1  (*                                                                    *)
00000000  1  (*   R_CODE     Output - A code indicating how things turned out.     *)
00000000  1  (*                0 indicates no error; data records completed.       *)
00000000  1  (*                1 indicates end of file; should never happen.       *)
00000000  1  (*                2 indicates invalid disk; should never happen.      *)
00000000  1  (*                3 indicates file not found, invalid dcb; should     *)
00000000  1  (*                  never happen.                                     *)
00000000  1  (*                5 indicates no free pages available.                *)
00000000  1  (*                6 indicates file corrupt.                           *)
00000000  1  (*                                                                    *)
00000000  1  (* Value Parameters:    None                                          *)
00000000  1  (*                                                                    *)
00000000  1  (*********************************************************************)
00000000  1  (* Procedures called by UNLOAD_TMA:                                   *)
00000000  1  (*                           TMA_FILTER                               *)
00000000  1  (*                           GET_HOOK_OFFSET                          *)
00000000  1  (*                           HOW_MUCH_DATA                            *)
00000000  1  (*                           GET_DATA                                 *)
00000000  1  (*                           UNLOAD_MSG                               *)
00000000  1  (*                           FIX_TM_INDENT                            *)
00000000  1  (*                           WRITE_ANLYS_REC                          *)
00000000  1  (*                                                                    *)
```

```
00000000 1 (* Functions called by UNLOAD_TMA:                                  *)
00000000 1 (*                             CLASSIFY_HOOK                         *)
00000000 1 (*                             MASK_BITS                             *)
00000000 1 (*                             UNLOAD_DONE                           *)
00000000 1 (*                                                                   *)
00000000 1 (*******************************************************************)
00000000 1 (* Procedure UNLOAD_TMA is the post-processor for the trace modules  *)
00000000 1 (* all measurement.  It unloads the hardware one sextuplet at a time, *)
00000000 1 (* classifying the data, filtering out certain data, and creating    *)
00000000 1 (* valid trace file data records.  May be called more than once per  *)
00000000 1 (* measurement.                                                      *)
00000000 1 (*-*****************************************************************)
00000000 1
00000000 1 PROCEDURE UNLOAD_TMA (VAR MEAS_: CMD_DATA_ARRAY; VAR SYMS_:SYM_DESCRIPS;
00000000 2                      VAR FLAGS_: FLAG_ARRAY_TYPE; MAC_: S_INT;
00000000 2                      VAR SPEC: HW_SPEC_REC; VAR UNLD_COUNT, R_CODE:
00000000 2                      S_INT);
00000000 2
00000000 2 VAR
00000000 2   START_LOCATION: S_INT;        (* First location to unload.        *)
00000002 2   NUM_LOCATIONS: S_INT;         (* Number of locations to unload.   *)
00000004 2
00000004 2   MEM_COUNT: S_INT;             (* Memory unload count.             *)
00000006 2
00000006 2   CURRENT_BASE: DOUBLE_ARRAY;   (* Storage for current base count.  *)
0000000E 2   SEXTET_REC: SEXTET_REC_TYPE;  (* Storage for unloaded hw sextet.  *)
00000024 2
00000024 2   PASSED_FILTER: BOOLEAN;       (* Flag indicating whether or not the *)
00000025 2                                 (* filter test passed.              *)
00000025 2   OFFSET_OK: BOOLEAN;           (* Flag indicating whether or not the *)
00000026 2                                 (* hook offset could be calculated. *)
00000026 2   HOOK_KIND: S_INT;             (* The kind of hook, PROC_ENTRY or  *)
00000028 2                                 (* PROC_EXIT, that is in the current *)
00000028 2                                 (* hardware sextet.                 *)
00000028 2   HOOK_OFFSET: L_INT;           (* Address offset of either the entry *)
0000002C 2                                 (* or exit hook captured with respect *)
0000002C 2                                 (* to the actual procedure entry or *)
0000002C 2                                 (* or exit point.                   *)
0000002C 2
0000002C 2   LONG_INDENT: L_INT;           (* Long integer version of          *)
0000074C 2                                 (* CURRENT_INDENT.                  *)
0000074C 2
0000074C 2
0000074C 2 BEGIN
0000074C 2
0000074C 2   R_CODE := NO_ERROR;           (* No error to start with.          *)
00000752 2
00000752 2   HOW_MUCH_DATA (FLAGS_, SPEC.FEATURES, SPEC.START_MAC, MAC_,
00000752 2                 START_LOCATION, NUM_LOCATIONS);
0000077C 2                                 (* Figure out how much to unload.   *)
0000077C 2
0000077C 2   MEM_COUNT := 1;
00000782 2   WHILE (MEM_COUNT <= NUM_LOCATIONS) AND (R_CODE = NO_ERROR)
00000782 2       AND (UNLOAD_DONE (UNLD_COUNT) = FALSE) DO
000007BC 2     BEGIN      (* Unload a sextet and possibly create a data record. *)
000007BC 2       UNLOAD_MSG (MEM_COUNT);   (* Tell the world where we are.     *)
000007C6 2
000007C6 2       GET_DATA (START_LOCATION, MEM_COUNT, SPEC.FEATURES, CURRENT_BASE,
000007C6 2                 SEXTET_REC);
000007EA 2                 (* Pull the sextet out of the hardware, reformat the *)
000007EA 2                 (* count tag, and standardize the status.           *)
000007EA 2
000007EA 2       HOOK_KIND := CLASSIFY_HOOK (SEXTET_REC.DATA, TMA_HOOKS);
000007FC 2                 (* Clasify the hook as either "entry" or "exit".    *)
000007FC 2
000007FC 2       IF HOOK_KIND <> GARBAGE   (* Could get GARBAGE if unloading   *)
00000808 2       THEN                      (* non-real-time enable state.      *)
00000808 2         BEGIN
00000808 2           GET_HOOK_OFFSET (SEXTET_REC.ADRS, HOOK_KIND, MEAS_, SYMS_,
00000808 2                            HOOK_OFFSET, OFFSET_OK);
0000082C 2                 (* Get the address offset of the hook captured with *)
0000082C 2                 (* respect to the procedure entry or exit in MEAS_. *)
0000082C 2
0000082C 2           IF OFFSET_OK          (* Do we have a valid offset?       *)
```

```
00000834  2            THEN                  (* Yes, continue.                   *)
00000834  2              BEGIN
00000834  2                TMA_FILTER (SEXTET_REC, HOOK_KIND, HOOK_OFFSET,
00000834  2                            PASSED_FILTER);
0000084E  2                  (* Perform the processor specific garbage filtering.  *)
0000084E  2
0000084E  2                IF PASSED_FILTER  (* Did we get thru the garbage filter?*)
00000856  2                THEN              (* Yes, we have legitimate info.      *)
00000856  2                  BEGIN
00000856  2                    FIX_TM_INDENT (HOOK_KIND, PREV_HOOK_KIND,
00000856  2                                   FOOTDC_INFO.MIN_INDENT, CURRENT_INDENT);
00000872  2                                  (* Keep track of module indentation.  *)
00000872  2
00000872  2                    LONG_INDENT := MASK_BITS (0000FFFFH,
00000872  2                                              L_INT(CURRENT_INDENT));
0000088C  2                  (* Do a type change; set upper word zero.             *)
0000088C  2
0000088C  2                    WRITE_ANLYS_REC (HOOK_KIND, -1, LONG_INDENT,
0000088C  2                                     SEXTET_REC, UNLD_COUNT, R_CODE)
000008B4  2                                  (* And out goes a data record.        *)
000008B4  2                  END
000008B4  2                END
000008B4  2            END;
000008B4  2
000008B4  2          MEM_COUNT := MEM_COUNT + 1
000008B8  2                                  (* Go on to the next hardware sextet. *)
000008B8  2        END;
000008BC  2
000008BC  2    FOOTDC_INFO.UPDATE_FLAG := TRUE
000008C2  2                                  (* Tell someone trace file needs to   *)
000008C2  2                                  (* be updated someday.                *)
000008C2  2  END;                            (* End of procedure UNLOAD_TMA.       *)
00000000  1
00000000  1  $GLOBPROC OFF$
00000000  1  .                               (* End of program TRACE_AMOD.         *)
00000000  1
00000000  1  (************************* End of document ***************************)

508: Warning: field or entry alignment; record or array comparisons may not work

End of compilation, number of errors=    0
00000000  1  "68000" PREPROCESS
00000000  1  $EXTENSIONS ON$
00000000  1  PROGRAM COOKIE_PROG;
00000000  1  (*
00000000  1  ******************************** COOKIE ********************************
00000000  1    The program that never gives up until it gets what it wants.
00000000  1    Actually, this is the Soda Dynamic/Static Controller debug program.
00000000  1    It scans the command line once in a while to pick up debug option
00000000  1    codes, passing them along to the Controller so it can implement them.
00000000  1    Author: Kip Fulghum
00000000  1    Date: 2-9-84  Revised: 10-5-84
00000000  1  ************************************************************************
00000000  1
00000000  1    COOKIE contains the following routines:
00000000  1    -Procedure EAT_COOKIE eats the accepted cookie off the command line.
00000000  1    -Function DECODE decodes a character from a marquis message.
00000000  1    -Procedure MARQUIS scrolls a message across the display line.
00000000  1    -Global procedure COOKIE_MONSTER scans the command line for cookies,
00000000  1     then takes appropriate action.
00000000  1    -Global procedure DEBUG_BREAK formats up all the given information
00000000  1     about a break point, then puts it up on the debug line.
00000000  1
00000000  1    In addition, the following external routines are used:  EXIT_, SLEEP_,
00000000  1    BPC_READ, BPC_WRITE, and FORMAT.
00000000  1                                                                       *)
00000000  1  (*
00000000  1                       *************************
00000000  1                       ***** Include Files *****
00000000  1                       *************************
00000000  1                                                                       *)
00000000  1
00000000  1  #INCLUDE DEBUG_CONST:SS_DYN
00000000  1
```

```
00000000 1 #INCLUDE COM_TYPES:SS_DYN
00000000 1
00000000 1 CONST
00000000 1
00000000 1   MIN_COOKIE     = -4; (* Minimum cookie number in DEBUG_OPTIONS *)
00000000 1
00000000 1   MAX_COOKIE     = 4; (* Maximum cookie number in DEBUG_OPTIONS *)
00000000 1
00000000 1   MIN_LINE       = -6; (* Minimum line number in DEBUG_LINES *)
00000000 1
00000000 1   MAX_LINE       = 4; (* Maximum line number in DEBUG_LINES *)
00000000 1
00000000 1   DEBUG_PSWRD1   = MIN_COOKIE; (* First password *)
00000000 1
00000000 1   DEBUG_PSWRD2   = MIN_COOKIE + 1; (* Second password *)
00000000 1
00000000 1   DEBUG_PRJCT_TM = MIN_COOKIE + 2; (* Project team *)
00000000 1
00000000 1   PRJCT_LINE     = MIN_LINE; (* Password successful line *)
00000000 1
00000000 1   GOTCHA_LINE    = MIN_LINE + 1; (* Password error line *)
00000000 1
00000000 1   COMMAND        = 0FF9DH; (* Word address of COMMAND *)
00000000 1
00000000 1   CURSOR         = 0FF9FH; (* Word address of cursor location *)
00000000 1
00000000 1   DISPLAY_LINE   = 0FCEBH; (* Word address of line above status line *)
00000000 1
00000000 1   CMD_LINE       = 0FD60H; (* Word address of command line *)
00000000 1
00000000 1   MAX_CRUMBS     = 8; (* Maximum # of cookie crumbs *)
00000000 1
00000000 1   MAX_LUMPS      = MAX_CRUMBS DIV 2; (* Maximum # of large crumbs *)
00000000 1
00000000 1   END_SCROLL     = CHAR ( 80H ); (* Char marking end of scroll msg *)
00000000 1
00000000 1   END_ENHANCE    = CHAR ( 80H ); (* End enhancement character *)
00000000 1
00000000 1 TYPE
00000000 1
00000000 1   COOKIE_TYPE = ARRAY [ 0..MAX_CRUMBS-1 ] OF CHAR;
00000000 1
00000000 1   COOKIE_ARRAY = ARRAY [ MIN_COOKIE..MAX_COOKIE ] OF COOKIE_TYPE;
00000000 1
00000000 1   LINE_TYPE = ARRAY [ 0..79 ] OF CHAR;
00000000 1
00000000 1   LINE_PTR = ^LINE_TYPE;
00000000 1
00000000 1   LINE_ARRAY = ARRAY [ MIN_LINE..MAX_LINE ] OF LINE_PTR;
00000000 1
00000000 1 VAR
00000000 1
00000000 1   COOKIE_BUF:  COOKIE_TYPE; (* Storage for user response *)
00000008 1
00000008 1   SCROLL_BUF:  LINE_TYPE; (* Storage for scroll message *)
00000058 1
00000058 1 $EXTVAR ONS
00000058 1
00000058 1   DEBUG_FLAG:  S_INT; (* Flag indicating current debug option *)
00000058 1
00000058 1   DEBUG_OPTIONS:  COOKIE_ARRAY; (* Array of debug option cookies *)
00000058 1
00000058 1   DEBUG_LINES:  LINE_ARRAY; (* Array of ptrs to debug option lines *)
00000058 1
00000058 1   DEBUG_MBUF:  COOKIE_TYPE; (* Part of LINE_ARRAY [ 1 ]^ for debug
00000058 1                                option *) ,
00000058 1
00000058 1   DEBUG_BBUF:  LINE_TYPE; (* Debug break info buffer line *)
00000058 1
00000058 1 $EXTVAR OFFS
00000058 1
00000058 1
00000058 1
00000058 1
```

```
00000058 1
00000058 1  $CALL_ABS_LONGS
00000000 1  (*
00000000 1                          *****************
00000000 1                          ***** EXIT_ *****
00000000 1                          *****************
00000000 1                                                                  *)
00000000 1  PROCEDURE EXIT_; EXTERNAL;
00000000 1  (*
00000000 1    Procedure EXIT_ to remove a process from further execution:
00000000 1    its status is set in limbo.  Provided as part of the operating system.
00000000 1                                                                  *)
00000000 1
00000000 1
00000000 1
00000000 1
00000000 1
00000000 1  (*
00000000 1                          ******************
00000000 1                          ***** SLEEP_ *****
00000000 1                          ******************
00000000 1                                                                  *)
00000000 1  PROCEDURE SLEEP_ ( CHAN:  L_INT; PRI:  S_INT ); EXTERNAL;
00000000 1  (*
00000000 1    Procedure SLEEP_ to put a process to sleep ( ie suspended state )
00000000 1    until a certain signal is received.  Provided as part of the
00000000 1    operating system.
00000000 1                                                                  *)
00000000 1
00000000 1
00000000 1
00000000 1
00000000 1
00000000 1
00000000 1  (*
00000000 1                         ********************
00000000 1                         ***** BPC_READ *****
00000000 1                         ********************
00000000 1                                                                  *)
00000000 1  PROCEDURE BPC_READ ( ADDR_68K:  L_INT; ADDR_BPC, LENGTH:  S_INT );
00000000 2                      EXTERNAL;
00000000 1  (*
00000000 1    Procedure BPC_READ to read memory locations over in the BPC
00000000 1    processor's memory.  68000 is byte address, BPC is word address,
00000000 1    length in words.  Provided as part of the message handler.
00000000 1                                                                  *)
00000000 1
00000000 1
00000000 1
00000000 1
00000000 1
00000000 1  (*
00000000 1                        *********************
00000000 1                        ***** BPC_WRITE *****
00000000 1                        *********************
00000000 1                                                                  *)
00000000 1  PROCEDURE BPC_WRITE ( ADDR_68K:  L_INT; ADDR_BPC, LENGTH:  S_INT );
00000000 2                       EXTERNAL;
00000000 1  (*
00000000 1    Procedure BPC_WRITE to write memory locations over in the BPC
00000000 1    processor's memory.  68000 is byte address, BPC is word address,
00000000 1    length in words.  Provided as part of the message handler.
00000000 1                                                                  *)
00000000 1
00000000 1
00000000 1
00000000 1
00000000 1
00000000 1  (*
00000000 1                          ******************
00000000 1                          ***** FORMAT *****
00000000 1                          ******************
00000000 1                                                                  *)
00000000 1  PROCEDURE FORMAT ( SIGNED:  BOOLEAN; VAR SOURCE:  L_INT; SOURCE_SIZE:
00000000 2                    S_INT; VAR DEST:  CHAR; VAR DEST_SIZE:  S_INT; BASE,
```

```
00000000  2                   JUSTIFY:  S_INT ); EXTERNAL;
00000058  1  (*
00000058  1    Procedure FORMAT to format numbers into ascii strings.  FORMAT
00000058  1    interfaces to the Pisces FORMATTER.  Provided as a Pascal external.
00000058  1                                                                        *)
00000058  1
00000058  1
00000058  1
00000058  1
00000058  1
00000058  1  $CALL_PC_SHORTS
00000000  1  (*
00000000  1                            **********************
00000000  1                            ***** EAT_COOKIE *****
00000000  1                            **********************
00000000  1                                                                        *)
00000000  1  PROCEDURE EAT_COOKIE;
00000000  2  (*
00000000  2    Procedure EAT_COOKIE to "eat" the accepted cookie off the command line
00000000  2    to the delight of all 10 year olds.
00000000  2
00000000  2    EAT_COOKIE uses the following routines:  SLEEP_ and BPC_WRITE.
00000000  2
00000000  2    Input:  none
00000000  2    Output:  none - erases COOKIE_BUF.
00000000  2                                                                        *)
00000000  2  VAR
00000000  2
00000000  2    I:  S_INT; (* WHILE loop counter *)
00000002  2
00000002  2    START_CURSOR:  S_INT; (* Address of CURSOR on BPC *)
00000004  2
00000004  2    REP_CHAR:  CHAR; (* Replacement character *)
00000004  2
00000004  2  BEGIN (* Procedure EAT_COOKIE *)
00000004  2    REP_CHAR := "-";
0000000A  2    I := 0;
0000000E  2    WHILE ( I < MAX_CRUMBS ) AND ( COOKIE_BUF [ I ] <> " " ) DO
00000038  2      BEGIN (* Eat the cookie *)
00000038  2        COOKIE_BUF [ I ] := REP_CHAR;
0000003E  2        BPC_WRITE ( L_INT ( ADDR ( COOKIE_BUF [ 0 ] ) ), CMD_LINE,
0000003E  2                    MAX_LUMPS );
00000054  2        COOKIE_BUF [ I ] := " ";
00000062  2        IF REP_CHAR = "-"
0000006E  2          THEN (* Change to open mouth *)
0000006E  2            REP_CHAR := "<"
00000078  2          ELSE (* Change to closed mouth *)
00000078  2            REP_CHAR := "-";
0000007E  2        SLEEP_ ( 20, -20 );
00000090  2        I := I + 1
00000094  2      END; (* Eat the cookie *)
00000098  2    (* Clear the line of last character *)
00000098  2    BPC_WRITE ( L_INT ( ADDR ( COOKIE_BUF [ 0 ] ) ), CMD_LINE,
00000098  2                MAX_LUMPS );
000000AE  2    (* Reset the cursor *)
000000AE  2    START_CURSOR := SHIFT ( CMD_LINE, 1 ); (* Create byte address *)
000000BA  2    BPC_WRITE ( L_INT ( ADDR ( START_CURSOR ) ), CURSOR, 1 )
000000DD  2  END; (* Procedure EAT_COOKIE *)
00000000  1
00000000  1
00000000  1
00000000  1
00000000  1
00000000  1  (*
00000000  1                            ********************
00000000  1                            ***** DECODE *****
00000000  1                            ********************
00000000  1                                                                        *)
00000000  1  FUNCTION DECODE ( CHARACTER:  CHAR ):  CHAR;
000000D8  2  (*
000000D8  2    Function DECODE to decode a character from a marquis message.
000000D8  2    Function simply subtracts 1 from all alphabetic characters, unless
000000D8  2    the character is an "A" or "a", in which case it is unwrapped to
000000D8  2    a "Z" or "z", respectively.
```

```
00000DB8  2
00000DB8  2    Input:  1) CHARACTER, the character to decode
00000DB8  2    Output:  1) the decoded character, in function name
00000DB8  2                                                                    *)
00000DB8  2  BEGIN (* Function DECODE *)
00000DB8  2    IF ( ( CHARACTER >= "A" ) AND ( CHARACTER <= "Z" ) ) OR
00000DB8  2       ( ( CHARACTER >= "a" ) AND ( CHARACTER <= "z" ) )
0000010E  2      THEN (* We want to decode this character *)
0000010E  2        IF ( CHARACTER = "A" ) OR ( CHARACTER = "a" )
00000128  2          THEN (* Encoding wrapped *)
00000128  2            DECODE := CHARACTER + CHAR ( 19H )
00000134  2          ELSE (* No wrap *)
00000134  2            DECODE := CHARACTER - CHAR ( 01H )
00000142  2      ELSE (* Don't want to decode this character *)
00000142  2        DECODE := CHARACTER
00000148  2  END; (* Function DECODE *)
00000000  1
00000000  1
00000000  1
00000000  1
00000000  1
00000000  1  (*
00000000  1                           ********************
00000000  1                           ***** MARQUIS *****
00000000  1                           ********************
00000000  1                                                                    *)
00000000  1  PROCEDURE MARQUIS ( VAR SCROLL_MSG:  LINE_TYPE );
00000000  2  (*
00000000  2    Procedure MARQUIS to "scroll" a message line across the screen, like
00000000  2    a movie marquis, again to the delight of all 10 year olds.
00000000  2
00000000  2    MARQUIS uses the following routines:  DECODE, SLEEP_, and BPC_WRITE.
00000000  2
00000000  2    Input:  1) SCROLL_MSG, the line to be scrolled across
00000000  2    Output:  none
00000000  2                                                                    *)
00000000  2  VAR
00000000  2
00000000  2    I:  S_INT; (* WHILE loop index *)
00000002  2
00000002  2    J:  S_INT; (* FOR loop index *)
00000156  2
00000156  2  BEGIN (* Procedure MARQUIS *)
00000156  2    SCROLL_BUF := DEBUG_LINES [ DEBUG_OFF ]^; (* Erase buffer *)
00000166  2    SCROLL_BUF [ 79 ] := END_ENHANCE; (* Prepare for enhancement chars *)
0000016C  2
0000016C  2    (* Now, scroll it *)
0000016C  2
0000016C  2    I := 0;
00000170  2    WHILE SCROLL_BUF [ 1 ] <> END_ENHANCE DO
0000017C  2      BEGIN (* Scroll the message *)
0000017C  2
0000017C  2        (* Pack scroll buffer *)
0000017C  2        FOR J := 1 TO 77 DO
00000182  2          SCROLL_BUF [ J ] := SCROLL_BUF [ J+1 ];
000001A6  2
000001A6  2        (* Put last character in buffer *)
000001A6  2        IF SCROLL_MSG [ I ] = END_SCROLL
000001BA  2          THEN (* No more message in buffer:  mark the end *)
000001BA  2            SCROLL_BUF [ 78 ] := END_ENHANCE
000001C4  2          ELSE (* Still more message *)
000001C4  2            BEGIN (* Move on *)
000001C4  2              SCROLL_BUF [ 78 ] := DECODE ( SCROLL_MSG [ I ] );
000001DA  2              I := I + 1
000001DE  2            END; (* Move on *)
000001DE  2
000001DE  2        (* Write packed buffer out and rest *)
000001DE  2        BPC_WRITE ( L_INT ( ADDR ( SCROLL_BUF ) ), DISPLAY_LINE, 40 );
000001F4  2        SLEEP_ ( 6, -20 ); (* Nap *)
00000206  2
00000206  2        (* Check for enhancement character at front of buffer *)
00000206  2        IF SCROLL_BUF [ 1 ] >= END_ENHANCE
00000212  2          THEN (* Enhancement character must be remembered *)
00000212  2            SCROLL_BUF [ 0 ] := SCROLL_BUF [ 1 ]
```

```
00000216  2      END; (* Scroll the message *)
0000021A  2
0000021A  2    (* Erase the line *)
0000021A  2    BPC_WRITE ( L_INT ( ADDR ( DEBUG_LINES [ DEBUG_OFF ]^ ) ),
0000021A  2                DISPLAY_LINE, 40 )
0000022E  2  END; (* Procedure MARQUIS *)
00000000  1
00000000  1
00000000  1
00000000  1
00000000  1
00000000  1  (*
00000000  1                        ***************************
00000000  1                        ***** COOKIE_MONSTER *****
00000000  1                        ***************************
00000000  1                                                                   *)
00000000  1  $GLOBPROC ON$
00000000  1  PROCEDURE COOKIE_MONSTER;
00000000  2  (*
00000000  2    Here it is.  The procedure you've all been waiting for.
00000000  2    COOKIE_MONSTER scans the command line for a cookie that he wants,
00000000  2    devours it, decides why it was there, then rests for a few seconds.
00000000  2
00000000  2    COOKIE_MONSTER uses the following routines:  EAT_COOKIE, DECODE,
00000000  2    MARQUIS, EXIT_, SLEEP_, BPC_READ, and BPC_WRITE.
00000000  2                                                                   *)
00000000  2  VAR
00000000  2
00000000  2    I:  S_INT; (* FOR loop index *)
00000002  2
00000002  2    TRIES:  S_INT; (* # tries at passwords *)
00000236  2
00000236  2  BEGIN (* Procedure COOKIE_MONSTER *)
00000236  2    TRIES := -1;
0000023C  2
0000023C  2    WHILE TRIES <> 0 DO
00000244  2      BEGIN (* Check for debug options and passwords *)
00000244  2        SLEEP_ ( 300, -20 ); (* Sleep 5 seconds *)
00000256  2        (* Check the command line for response *)
00000256  2        BPC_READ ( L_INT ( ADDR ( COOKIE_BUF [ 0 ] ) ), CMD_LINE,
00000256  2                   MAX_LUMPS );
0000026C  2
0000026C  2        (* Check for debug options *)
0000026C  2
0000026C  2        FOR I := MIN_COOKIE TO MAX_COOKIE DO
00000272  2          IF COOKIE_BUF = DEBUG_OPTIONS [ I ]
00000292  2            THEN (* Found a debug option *)
00000292  2              BEGIN (* Set it up *)
00000292  2                EAT_COOKIE;
00000296  2                IF I >= 0
0000029E  2                  THEN (* These options use a line *)
0000029E  2                    BEGIN (* Put option in line *)
0000029E  2                      DEBUG_MBUF := DEBUG_OPTIONS [ I ];
000002B6  2                      BPC_WRITE ( L_INT ( ADDR ( DEBUG_LINES [ I ]^ ) ),
000002B6  2                                  DISPLAY_LINE, 40 )
000002B6  2                    END (* Put option in line *)
000002DA  2                  ELSE (* These options use a marquis *)
000002DA  2                    BEGIN (* Marquis the line *)
000002DA  2                      MARQUIS ( DEBUG_LINES [ I ]^ );
000002F2  2                      IF I = DEBUG_PRJCT_TM
000002FE  2                        THEN (* Someone wants in:  start timer *)
000002FE  2                          TRIES := 3;
00000304  2                      IF I < DEBUG_PRJCT_TM
00000310  2                        THEN (* Someone peeked at the absolute file *)
00000310  2                          TRIES := 0
00000314  2                    END; (* Marquis the line *)
00000314  2                DEBUG_FLAG := I (* Set debug option *)
0000031A  2              END; (* Set it up *)
0000032C  2
0000032C  2        (* Descramble cookie *)
0000032C  2        FOR I := 0 TO 4 DO
00000330  2          COOKIE_BUF [ I ] := COOKIE_BUF [ I ] + CHAR ( I+1 );
0000035C  2
0000035C  2        (* Check for passwords *)
```

```
0000035C  2
0000035C  2        FOR I := DEBUG_PSWRD1 TO DEBUG_PSWRD2 DO
00000362  2          IF COOKIE_BUF = DEBUG_OPTIONS [ I ]
00000382  2            THEN (* Found a password *)
00000382  2              BEGIN (* Set it up *)
00000382  2                EAT_COOKIE;
00000386  2                IF ( I = DEBUG_PSWRD1 ) AND
00000396  2                   ( ( DEBUG_FLAG <> DEBUG_PRJCT_TM ) OR ( TRIES <> 2 ) )
000003B8  2                  THEN (* First password but the guy goofed *)
000003B8  2                    TRIES := 1;
000003BE  2                IF I = DEBUG_PSWRD2
000003CA  2                  THEN (* Second password *)
000003CA  2                    IF ( DEBUG_FLAG = DEBUG_PSWRD1 ) AND ( TRIES = 1 )
000003EC  2                      THEN (* Bingo! *)
000003EC  2                        BEGIN (* Marquis the line *)
000003EC  2                          MARQUIS ( DEBUG_LINES [ PRJCT_LINE ]^ );
000003F8  2                          TRIES := -1
000003FE  2                        END (* Marquis the line *)
00000402  2                      ELSE (* Goofed again *)
00000402  2                        TRIES := 1;
00000408  2                DEBUG_FLAG := I
0000040E  2              END; (* Set it up *)
00000420  2
00000420  2        (* See if we should go away *)
00000420  2
00000420  2        IF TRIES > 0
00000428  2          THEN (* Someone tried to get in *)
00000428  2            BEGIN (* Decrement tries *)
00000428  2              TRIES := TRIES - 1;
0000042C  2              IF TRIES = 0
00000434  2                THEN (* Out of time, buster *)
00000434  2                  MARQUIS ( DEBUG_LINES [ GOTCHA_LINE ]^ )
00000440  2            END (* Decrement tries *)
00000440  2      END; (* Check for debug options and passwords *)
00000444  2
00000444  2    (* Erase line and leave forever *)
00000444  2    BPC_WRITE ( L_INT ( ADDR ( DEBUG_LINES [ DEBUG_OFF ]^ ) ),
00000444  2                DISPLAY_LINE, 40 );
00000458  2    DEBUG_FLAG := DEBUG_OFF;
0000045C  2    EXIT_
00000462  2  END; (* Procedure COOKIE_MONSTER *)
00000000  1  $GLOBPROC OFF$
00000000  1
00000000  1
00000000  1
00000000  1
00000000  1
00000000  1  (*
00000000  1                              *************************
00000000  1                              ***** DEBUG_BREAK *****
00000000  1                              *************************
00000000  1                                                                         *)
00000000  1  $GLOBPROC ON$
00000000  1  PROCEDURE DEBUG_BREAK ( BCAUSE, DCLASS:  S_INT; PREV_PC, ADRS, NEXT_PC:
00000000  2                          L_INT );
00000000  2  (*
00000000  2    Procedure DEBUG_BREAK to format up all the given information about
00000000  2    a break point, then put it up on the debug line.  Procedure then
00000000  2    waits for a carriage return from the user before returning.
00000000  2
00000000  2    DEBUG_BREAK uses the following routines:  BPC_READ, BPC_WRITE, and
00000000  2    FORMAT.
00000000  2
00000000  2    Input:  1) BCAUSE, the cause of the break ( from CLASSIFY_BREAK )
00000000  2            2) DCLASS, the class of data at break ( from CLASS_PROC_DATA )
00000000  2            3) PREV_PC, the previous PC
00000000  2            4) ADRS, the address broken on
00000000  2            5) NEXT_PC, the next PC
00000000  2    Output:  none
00000000  2                                                                         *)
00000000  2  VAR
00000000  2
00000000  2    USER_CMD:  S_INT; (* Command from BPC *)
00000002  2
```

```
00000002 2    FSIZE:  S_INT; (* Format size *)
00000004 2
00000004 2    LONG_TEMP:  L_INT; (* Storage to effect a type change *)
0000046A 2
0000046A 2  BEGIN (* Procedure DEBUG_BREAK *)
0000046A 2
0000046A 2    (* Put Ns in string *)
0000046A 2    FSIZE := 3;
00000470 2    LONG_TEMP := BCAUSE;
0000047A 2    FORMAT ( TRUE, LONG_TEMP, 4, DEBUG_BBUF [ 10 ], FSIZE, 10, -1 );
000004A2 2    LONG_TEMP := BCLASS;
000004AC 2    FORMAT ( TRUE, LONG_TEMP, 4, DEBUG_BBUF [ 74 ], FSIZE, 10, -1 );
000004D4 2    FSIZE := 7;
000004DA 2    FORMAT ( FALSE, PREV_PC, 4, DEBUG_BBUF [ 24 ], FSIZE, 16, -1 );
00000500 2    FORMAT ( FALSE, ADRS, 4, DEBUG_BBUF [ 40 ], FSIZE, 16, -1 );
00000526 2    FORMAT ( FALSE, NEXT_PC, 4, DEBUG_BBUF [ 58 ], FSIZE, 16, -1 );
0000054C 2
0000054C 2    (* Write out line *)
0000054C 2    BPC_WRITE ( L_INT ( ADDR ( DEBUG_BBUF [ 0 ] ) ), DISPLAY_LINE, 40 );
00000562 2
00000562 2    (* Wait for carriage return *)
00000562 2    REPEAT
00000562 2      BPC_READ ( L_INT ( ADDR ( USER_CMD ) ), COMMAND, 1 )
00000578 2    UNTIL USER_CMD = 13
00000582 2  END; (* Procedure DEBUG_BREAK *)
00000000 1  $GLOBPROC OFF$
00000000 1  .

End of compilation, number of errors=    0

                 "68000"
                 *
                 *  Tabs at 5, 15, 35
                 *
                      GLOBAL DEBUG_PROG, DEBUG_STACK
                      GLOBAL DEBUG_OPTIONS, DEBUG_LINES, DEBUG_MBUF, DEBUG_BBUF
                      EXTERNAL COOKIE_MONSTER
                 *
                 ****************************** COOKIE_ASYM ******************************
                 *  COOKIE_ASYM supplies the necessary ascii strings for the Dynamic and
                 *  Static Controller debug module.  Module contains all ascii and the
                 *  stack required by the module.  COOKIE_ASYM is processor independent.
                 *  Author:  Kip Fulghum
                 *  Date:  2-9-84  Revised:  12-15-84
                 ************************************************************************
                 *
                      DATA
                 *
                 * Entry address for DEBUG_PROG
                 *
000000           DEBUG_PROG
000000 G0000000       DC.L       COOKIE_MONSTER
                 *
                 * Stack address for DEBUG_PROG
                 *
000004           DEBUG_STACK
000004 0005 7BFE      DC.L       COOKIE_STACK

                 *
                 * Array of debug option strings:  all 8 characters!
                 *
000008           DEBUG_OPTIONS
000008 0317151106     ASC        "  "            ; Password     # -4.
000010 140A041A0A     ASC        "

                                 "               ; Password     # -3.
000018 70726A6374     ASC        "prjct_tn"       ; Question     # -2.
000020 636F6F6B69     ASC        "cookie  "       ; Cookie       # -1.
000028 6465627567     ASC        "debugoff"       ; Debug option # 0.
000030 666F6F7464     ASC        "footdc  "       ; Debug option # 1.
000038 7472616365     ASC        "tracenod"       ; Debug option # 2.
000040 7472616365     ASC        "tracesta"       ; Debug option # 3.
000048 7472616365     ASC        "tracedat"       ; Debug option # 4.

                 *
```

```
                  * Array of pointers to debug line strings.
                  *
000050            DEBUG_LINES
000050 0000007C       DC.L     PRJCT_TM          ; Scroller after passwords.
000054 0000045E       DC.L     NO_WIZARD1        ; Scroller for password timeout.
                  *
000058 000004DC       DC.L     NO_WIZARD2        ; Scroller for password # -4.
00005C 000004BC       DC.L     NO_WIZARD2        ; Scroller for password # -3.
000060 0000052C       DC.L     WIZ_QUESTION      ; Scroller for question # -2.
000064 0000054E       DC.L     THANKYOU          ; Scroller for cookie   # -1.
000068 0000057A       DC.L     DEBUG_OFF         ; Line for debug option # 0.
00006C 000005CC       DC.L     DEBUG             ; Line for debug option # 1.
000070 000005CC       DC.L     DEBUG             ; Line for debug option # 2.
000074 000005CC       DC.L     DEBUG             ; Line for debug option # 3.
000078 000005CC       DC.L     DEBUG             ; Line for debug option # 4.

                  *
                  * Array of debug line strings:  all 30 characters ( except scrollers,
                  * which end with an SOH! ).
                  *
00007C            PRJCT_TM
00007C 9020           DC.W     9020H
00007E 5069206E6A     ASC      "Pi njhiuz nbtufs, zpv bsf joeffe b Xjabse!  ....  "
0000B0 4D6675206E     ASC      "Nfu nf jouspevdf nztfmg boe uif qspkfdu ufbm sftqp"
0000E2 6F746A636D     ASC      "otjcmf gps nz fyjtufodf.  J'n TPEB, TPguxbsf Efcvh"
000114 20426F626D     ASC      " Cobnzafs.  Bt gps uif ufbn, J'mm tubsu pvu xjui u"
000146 6966206962     ASC      "if ibsexbsf uzqft.  B hvz cz uif obnf pg Lfujo Ibm"
000178 6D20656A65     ASC      "n eje bmm uif sfdphojujpo boe qspdfttps tuvgg (jod"
0001AA 6D76656A6F     ASC      "mvejoh uif dvtupn JDt).  Ebo Tdinfnafs eje uif dpo"
0001DC 7573706D20     ASC      "uspm boe nfnpsz eftjho.  Hppe xpsl hvzt.  Bt gps u"
00020E 6966207470     ASC      "if tpguxbsf, Upn Cbudib xspuf bmm uif ebub cbtf dp"
000240 65662E2020     ASC      "ef.  Csfuu Dbsufs eje bmm uif joufsqspdfttps dpnmu"
000272 6F6A646275     ASC      "ojdbujpo boe ivnbo joufsgbdf tuvgg.  Ljq Gvmhivn e"
0002A4 66746A686F     ASC      "ftjhofe uif qspdftt nbobhfs, LJQOJY, boe uif nfbtv"
0002D6 73666E666F     ASC      "sfnfou dpousmmfst.  Gjobmmz, Ljq Tufxbsu xspuf ui"
000308 6620656A74     ASC      "f ejtqmbz tpguxbsf.  Ipopsbcmf nfoujpot hp up Wjuj"
00033A 626F204366     ASC      "bo Cfshfs gps tvqqpsujoh uif ejtqmbz tpguxbsf, Kpf"
00036C 204962786C     ASC      " Ibxl gps ebub cbtf difdl, Difszm Ozhbbse gps ebub"
00039E 2063627466     ASC      " cbtf/fnvmbujpo tvqqpsu, boe Tifssz Bebjs gps ofx "
0003D0 666E766D62     ASC      "fnvmbujpo tvqqpsu.  Boe op qspkfdu ufbn jt dpnqmfu"
000402 6620786A75     ASC      "f xjuipvu b qspkfdu nbobhfs. Hbjm Ibnjmupo.  Cfmjf"
000434 7766206E66     ASC      "wf nf, xf bmm eftfswf b cbu po uif cbdl!"
00045C 2080           DC.W     2080H
00045E            NO_WIZARD1
00045E 9020           DC.W     9020H
000460 5A70762062     ASC      "Zpv bsf op Xjabse!  Zpv bsf bo jnqptufs gps xipn J"
000492 20786A6D6D     ASC      " xjmm ofufs sfufbm uibu xijdi zpv tffl! "
0004BA 8020           DC.W     8020H
0004BC            NO_WIZARD2
0004BC 9020           DC.W     9020H
0004BE 5A70762062     ASC      "Zpv bsf op Xjabse!  Zpv ibwf buufnqufe up tufbm nz"
0004F0 206C6F7078     ASC      " lopxmfehf cju cz cju, bu xijdi J mbvhi boe cje zp"
000522 762062656A     ASC      "v bejfv!"
00052A 2080           DC.W     2080H
00052C            WIZ_QUESTION
00052C 9020           DC.W     9020H
00052E 4373627766     ASC      "Csbwf tpvm, bsu uipv b Xjabse?"
00054C 2080           DC.W     2080H
00054E            THANKYOU
00054E 9020           DC.W     9020H
000550 5569626F6C     ASC      "Uibol zpv wfsz nvdi.  Ju xbt efmjdjpvt! "
000578 8020           DC.W     8020H
00057A            DEBUG_OFF
00057A 2020202020     ASC      "                                        "
0005A2 2020202020     ASC      "                                        "
0005CA 8020           DC.W     8020H             ; Here in case this is scrolled!
0005CC            DEBUG
0005CC 9020           DC.W     9020H
0005CE 2048502036     ASC      " HP 64340 Dynamic/Static Controller:  "
0005F4            DEBUG_MBUF
0005F4 2020202020     ASC      "        "
0005FC 2044656275     ASC      " Debug Option - Version   I.j."
00061A 2080           DC.W     2080H
00061C            DEBUG_DBUF
```

```
00061C 9020                  DC.W     9020H
00061E 427265616B            ASC      "Break = "
000626 20202020              ASC      "    "             ; Bytes 10-13:  break cause.
00062A 5072657620            ASC      "Prev PC = "
000634 2020202020            ASC      "        "         ; Bytes 24-31:  previous PC.
00063C 4164727320            ASC      "Adrs =  "
000644 2020202020            ASC      "        "         ; Bytes 40-47:  address.
00064C 4E65787420            ASC      "Next PC = "
000656 2020202020            ASC      "        "         ; Bytes 58-65:  next PC.
00065E 436C617373            ASC      "Class = "
000666 20202020              ASC      "    "             ; Bytes 74-77:  data class.
00066A 2030                  DC.W     2030H

                                               ******************
                                               ***** 57BFEH *****
                                               ******************
                             ORG      57BFEH
                                            ***** Debug Stack *****
057BFE                   COOKIE_STACK
                                               ******************
                                               ***** 57B00H *****
                                               ******************
                             ORG      57B00H
057B00                       DS.B     100H
                             END

Errors=    0
 00000000  1  "68000" PREPROCESS
 00000000  1  $EXTENSIONS ON$
 00000000  1  $TITLE "Soda Trace Memory Manager"
 00000000  1  PROGRAM TRACE_MGR;
 00000000  1  (*
 00000000  1  ******************************** TRACE_MGR ********************************
 00000000  1    TRACE_MGR is the module containing the routines for basic manipulation
 00000000  1    of the trace memory for Soda.  All routines necessary for creating
 00000000  1    and accessing the trace memory "file" are contained in this module.
 00000000  1    Author:  Kip Fulghum
 00000000  1    Date:  2-7-84  Revised:  1-8-85
 00000000  1  ****************************************************************************
 00000000  1
 00000000  1    TRACE_MGR is really a mimic of the file manager.  It allows similar
 00000000  1    operations to a memory "file" that the file manager allows to disc
 00000000  1    files.  The parameters are the same, even if some have no meaning
 00000000  1    for memory.  This is so the trace file can be created in Soda's
 00000000  1    internal memory, or out on the disc with a minimum of effort.  Not
 00000000  1    all file manager routines are supported for the memory file, but the
 00000000  1    most important ones are.
 00000000  1
 00000000  1    TRACE_MGR contains the following routines:
 00000000  1    -Global procedure M_CREATE "creates" the trace memory file.
 00000000  1    -Global procedure M_OPEN "opens" the trace memory file.
 00000000  1    -Global procedure M_READ "reads" from the trace memory file.
 00000000  1    -Global procedure M_READBACKWARD "readsbackward" from the trace
 00000000  1     memory file.
 00000000  1    -Global procedure M_WRITE "writes" to the trace memory file.
 00000000  1    -Global procedure M_WRITEBACKWARD "writesbackward" to the trace
 00000000  1     memory file.
 00000000  1    -Global procedure M_POSITION "positions" in the trace memory file.
 00000000  1    -Global procedure M_CLOSE "closes" the trace memory file.
 00000000  1    -Global procedure M_DELETE "deletes" the trace memory file.
 00000000  1    -Global procedure M_FILE_ERR outputs an appropriate trace memory
 00000000  1     file error message.
 00000000  1    -Global procedure READRECNUM determines the current record position
 00000000  1     in the memory file.
 00000000  1    -Global function TRACE_SIZE returns the number of words left in the
 00000000  1     trace file.
 00000000  1
 00000000  1    In addition, TRACE_MGR uses the following external routines:
 00000000  1    P_MESSAGE and MOVE_WORDS.
 00000000  1                                                                   *)
 00000000  1  (*
 00000000  1                       **************************
 00000000  1                       ***** Include Files *****
 00000000  1                       **************************
```

```
00000000 1                                                        *)
00000000 1
00000000 1  #INCLUDE COM_TYPES:SS_DYN
00000000 1
00000000 1  #INCLUDE FM_TYPES:SS_DYN
00000000 1
00000000 1  #INCLUDE MSG_TYPES:SS_DYN
00000000 1
00000000 1
00000000 1
00000000 1
00000000 1
00000000 1  CONST
00000000 1
00000000 1    START_ADDRESS = 26000H; (* Starting address of memory file:  don't
00000000 1                              forget to change ORG if this changes! *)
00000000 1
00000000 1    END_ADDRESS   = 47FFFH; (* Ending address of memory file *)
00000000 1
00000000 1    MAX_INDEX     = ( END_ADDRESS-START_ADDRESS-1) DIV 2; (* Word index *)
00000000 1
00000000 1  TYPE
00000000 1
00000000 1    MEMORY_FILE_TYPE = ARRAY [ 0..MAX_INDEX ] OF S_INT;
00000000 1
00000000 1  VAR
00000000 1
00000000 1    CURRENT_REC:  S_INT; (* Current record # in file:  start with 1 *)
00000002 1
00000002 1    CURRENT_LOC:  L_INT; (* Current index in memory file *)
00000006 1
00000006 1  $ORG 26000H$
00000006 1
00000006 1    MEMORY_FILE:  MEMORY_FILE_TYPE; (* THE, I said THE, memory file *)
00000006 1
00000006 1  $END_ORG$
00000006 1
00000006 1  $EXTVAR ON$
00000006 1
00000006 1    MTF_ERROR:  MSG_PTR; (* Generic memory trace file error message *)
00000006 1
00000006 1  $EXTVAR OFF$
00000006 1
00000006 1
00000006 1
00000006 1
00000006 1
00000006 1  $CALL_ABS_LONG$
00000000 1  (*
00000000 1                          **********************
00000000 1                          ***** P_MESSAGE *****
00000000 1                          **********************
00000000 1                                                                  *)
00000000 1  PROCEDURE P_MESSAGE ( MESSAGE:  MSG_PTR; MSG_CODE:  S_INT ); EXTERNAL;
00000000 1  (*
00000000 1    Procedure P_MESSAGE to interface to the Pisces status line message
00000000 1    routine, MESSAGE.  P_MESSAGE uses MESSAGE to output the given
00000000 1    message to the display given the ascii string, its length, and a
00000000 1    message code indicating what type of message it is and how it is to
00000000 1    be cleared.
00000000 1                                                                  *)
00000000 1
00000000 1
00000000 1
00000000 1
00000000 1
00000000 1  $CALL_PC_SHORT$
00000000 1  (*
00000000 1                          ***********************
00000000 1                          ***** MOVE_WORDS *****
00000000 1                          ***********************
00000000 1                                                                  *)
00000000 1  PROCEDURE MOVE_WORDS ( NUM:  S_INT; FFROM, TTO:  S_INT_PTR );
00000000 2                         EXTERNAL;
```

```
00000000 1 (*
00000000 1   Procedure MOVE_WORDS to move a given number of words from one location
00000000 1   in memory to another.  Provided as an assembly language external.
00000000 1                                                                         *)
00000000 1
00000000 1
00000000 1
00000000 1
00000000 1
00000000 1 (*
00000000 1                               ********************
00000000 1                               ***** M_CREATE *****
00000000 1                               ********************
00000000 1                                                                         *)
00000000 1 $GLOBPROC ON$
00000000 1 PROCEDURE M_CREATE ( VAR FNAME:  FNAME_ARRAY; FTYPE, DISC:  S_INT; VAR
00000000 2                      DCB:  DCB_TYPE; BSZ:  S_INT; VAR FMGR_CODE:
00000000 2                      S_INT );
00000004 2 (*
00000004 2   Procedure M_CREATE to "create" the trace memory file.  Procedure
00000004 2   initializes all variables to indicate we are at the start of the
00000004 2   memory file.
00000004 2
00000004 2   Input:  1) FNAME, the file name to be created ( not used )
00000004 2           2) FTYPE, the file type to create ( not used )
00000004 2           3) DISC, the disc on which to create the file ( not used )
00000004 2           4) DCB, the file's data control block ( not used )
00000004 2           5) BSZ, the block size, ie size of DCB to use ( not used )
00000004 2   Output:  1) FMGR_CODE, a code specifying how the create turned out:
00000004 2               0 indicates no error:  memory file created
00000004 2               no errors are possible
00000004 2                                                                         *)
00000004 2 BEGIN (* Procedure M_CREATE *)
00000004 2   FMGR_CODE := 0;
0000000A 2   CURRENT_REC := 1;
00000010 2   CURRENT_LOC := 0;
00000014 2   MEMORY_FILE [ 0 ] := 0 (* Set length word to 0 *)
0000001A 2 END; (* Procedure M_CREATE *)
00000000 1 $GLOBPROC OFF$
00000000 1
00000000 1
00000000 1
00000000 1
00000000 1
00000000 1 (*
00000000 1                               ******************
00000000 1                               ***** M_OPEN *****
00000000 1                               ******************
00000000 1                                                                         *)
00000000 1 $GLOBPROC ON$
00000000 1 PROCEDURE M_OPEN ( VAR FNAME:  FNAME_ARRAY; FTYPE, DISC:  S_INT; VAR
00000000 2                    DCB:  DCB_TYPE; BSZ:  S_INT; VAR FMGR_CODE:
00000000 2                    S_INT );
00000022 2 (*
00000022 2   Procedure M_OPEN to "open" the trace memory file.  Procedure
00000022 2   initializes all variables to indicate we are at the start of the
00000022 2   memory file.
00000022 2
00000022 2   Input:  1) FNAME, the file name to be opened ( not used )
00000022 2           2) FTYPE, the file type to open ( not used )
00000022 2           3) DISC, the disc on which to open the file ( not used )
00000022 2           4) DCB, the file's data control block ( not used )
00000022 2           5) BSZ, the block size, ie size of DCB to use ( not used )
00000022 2   Output:  1) FMGR_CODE, a code specifying how the open turned out:
00000022 2               0 indicates no error:  memory file opened
00000022 2               no errors are possible
00000022 2                                                                         *)
00000022 2 BEGIN (* Procedure M_OPEN *)
00000022 2   FMGR_CODE := 0;
00000028 2   CURRENT_REC := 1;
0000002E 2   CURRENT_LOC := 0
00000032 2 END; (* Procedure M_OPEN *)
00000000 1 $GLOBPROC OFF$
00000000 1
```

```
00000000  1
00000000  1
00000000  1
00000000  1
00000000  1  (*
00000000  1                          ******************
00000000  1                          ***** M_READ *****
00000000  1                          ******************
00000000  1                                                                   *)
00000000  1  $GLOBPROC ON$
00000000  1  PROCEDURE M_READ ( VAR DCB:  DCB_TYPE; VAR RBUF:  REC_TYPE; LENGTH:
00000000  2                    S_INT; VAR FMGR_CODE:  S_INT );
00000000  2  (*
00000000  2    Procedure M_READ to "read" from the trace memory file.  Procedure
00000000  2    reads the next record out of the trace memory file and returns it
00000000  2    to the caller.
00000000  2
00000000  2    Input:  1) DCB, the file's data control block ( not used )
00000000  2            2) RBUF, the buffer into which the record is to be read
00000000  2               ( should be at least LENGTH+1 words long )
00000000  2            3) LENGTH, the maximum # of words of the record to return
00000000  2    Output:  1) RBUF, the filled buffer, with the length in the lower
00000000  2                byte of the first word
00000000  2             2) FMGR_CODE, a code specifying how the read turned out:
00000000  2                 0 indicates no error:  next record read
00000000  2                 1 indicates end of file
00000000  2                                                                   *)
00000000  2  VAR
00000000  2
00000000  2    ACT_LENGTH:  S_INT; (* Word length of next record *)
00000002  2
00000002  2    WORDS_TO_GO:  S_INT; (* # words of record to ship *)
0000003A  2
0000003A  2  BEGIN (* Procedure M_READ *)
0000003A  2    FMGR_CODE := 0;
00000040  2    ACT_LENGTH := SHIFT ( SHIFT ( MEMORY_FILE [ CURRENT_LOC ], 8 ), -8 );
00000058  2    IF ACT_LENGTH = 0
0000005E  2      THEN (* End of file *)
0000005E  2        FMGR_CODE := 1
0000006A  2      ELSE (* Not at end of file *)
0000006A  2        BEGIN (* Read next record *)
0000006A  2          IF ACT_LENGTH > LENGTH
00000076  2            THEN (* Ship LENGTH *)
00000076  2              WORDS_TO_GO := LENGTH
00000080  2            ELSE (* Ship ACT_LENGTH *)
00000080  2              WORDS_TO_GO := ACT_LENGTH;
00000086  2          (* Ship the stuff to the caller's buffer *)
00000086  2          MOVE_WORDS ( WORDS_TO_GO, ADDR ( MEMORY_FILE [ CURRENT_LOC
00000086  2                     +1 ] ), ADDR ( RBUF [ 1 ] ) );
000000B2  2          (* Set length word in user buffer leaving upper byte alone *)
000000B2  2          RBUF [ 0 ] := SHIFT ( SHIFT ( RBUF [ 0 ], -8 ), 8 )
000000B2  2                        + WORDS_TO_GO;
000000C0  2          (* Update my indeces/counters *)
000000C0  2          CURRENT_REC := CURRENT_REC + 1;
000000C6  2          CURRENT_LOC := CURRENT_LOC + ACT_LENGTH + 1
000000D6  2        END (* Read next record *)
000000D6  2  END; (* Procedure M_READ *)
00000000  1  $GLOBPROC OFF$
00000000  1
00000000  1
00000000  1
00000000  1
00000000  1
00000000  1  (*
00000000  1                       **************************
00000000  1                       ***** M_READBACKWARD *****
00000000  1                       **************************
00000000  1                                                                   *)
00000000  1  $GLOBPROC ON$
00000000  1  PROCEDURE M_READBACKWARD ( VAR DCB:  DCB_TYPE; VAR RBUF:  REC_TYPE;
00000000  2                             LENGTH:  S_INT; VAR FMGR_CODE:  S_INT );
00000000  2  (*
00000000  2    Procedure M_READBACKWARD to "readbackward" from the trace memory
00000000  2    file.  Procedure reads the previous record out of the trace memory
```

```
00000000  2     file and returns it to the caller.
00000000  2
00000000  2     Input:  1) DCB, the file's data control block ( not used )
00000000  2             2) RBUF, the end of the buffer into which the record is to
00000000  2                be read ( should be at least LENGTH+1 words long )
00000000  2             3) LENGTH, the maximum # of words of the record to return
00000000  2     Output:  1) RBUF, the filled buffer, with the length in the upper
00000000  2                 byte of the end word
00000000  2              2) FMGR_CODE, a code specifying how the read turned out:
00000000  2                  0 indicates no error:  previous record read
00000000  2                  1 indicates end of file
00000000  2                                                                        *)
00000000  2   VAR
00000000  2
00000000  2     ACT_LENGTH:  S_INT; (* Word length of previous record *)
00000002  2
00000002  2     WORDS_TO_GO:  S_INT; (* # words of record to ship *)
000000DE  2
000000DE  2   BEGIN (* Procedure M_READBACKWARD *)
000000DE  2     FMGR_CODE := 0;
000000E4  2     ACT_LENGTH := SHIFT ( MEMORY_FILE [ CURRENT_LOC ], -8 );
000000FA  2     IF ACT_LENGTH = 0
00000100  2       THEN (* End of file *)
00000100  2         FMGR_CODE := 1
0000010C  2       ELSE (* Not at end of file *)
0000010C  2         BEGIN (* Read previous record *)
0000010C  2           IF ACT_LENGTH > LENGTH
00000118  2             THEN (* Ship LENGTH *)
00000118  2               WORDS_TO_GO := LENGTH
00000122  2             ELSE (* Ship ACT_LENGTH *)
00000122  2               WORDS_TO_GO := ACT_LENGTH;
00000128  2           (* Ship the stuff to the caller's buffer *)
00000128  2           MOVE_WORDS ( WORDS_TO_GO, ADDR ( MEMORY_FILE [ CURRENT_LOC
00000128  2                       -ACT_LENGTH ] ), ADDR ( RBUF [ -WORDS_TO_GO ] ) );
00000162  2           (* Set length word in user buffer leaving lower byte alone *)
00000162  2           RBUF [ 0 ] := SHIFT ( SHIFT ( RBUF [ 0 ], 8 ), -8 )
00000162  2                         + SHIFT ( WORDS_TO_GO, 8 );
00000176  2           (* Update my indeces/counters *)
00000176  2           CURRENT_REC := CURRENT_REC - 1;
0000017A  2           CURRENT_LOC := CURRENT_LOC - ACT_LENGTH - 1
0000018C  2         END (* Read previous record *)
0000018C  2   END; (* Procedure M_READBACKWARD *)
00000000  1   $GLOBPROC OFF$
00000000  1
00000000  1
00000000  1
00000000  1
00000000  1
00000000  1   (*
00000000  1                              ********************
00000000  1                              ***** M_WRITE *****
00000000  1                              ********************
00000000  1                                                                        *)
00000000  1   $GLOBPROC ON$
00000000  1   PROCEDURE M_WRITE ( VAR DCB:  DCB_TYPE; VAR RBUF:  REC_TYPE; VAR
00000000  2                       FMGR_CODE:  S_INT );
00000000  2   (*
00000000  2     Procedure M_WRITE to "write" to the trace memory file.  Procedure
00000000  2     writes the given record if it will fit in the memory file.
00000000  2
00000000  2     Input:  1) DCB, the file's data control block ( not used )
00000000  2             2) RBUF, the buffer to be written out, with the length in the
00000000  2                lower byte of the first word
00000000  2     Output:  1) FMGR_CODE, a code specifying how the write turned out:
00000000  2                 0 indicates no error:  next record written
00000000  2                 5 indicates file full
00000000  2                                                                        *)
00000000  2   VAR
00000000  2
00000000  2     ACT_LENGTH:  S_INT; (* Word length of record to write *)
00000194  2
00000194  2   BEGIN (* Procedure M_WRITE *)
00000194  2     FMGR_CODE := 0;
0000019A  2     ACT_LENGTH := SHIFT ( SHIFT ( RBUF [ 0 ], 8 ), -8 );
```

```
000001A8  2    IF ACT_LENGTH <> 0
000001AE  2      THEN (* He actually wants to write to the file *)
000001AE  2        IF ( CURRENT_LOC+ACT_LENGTH+1 ) > MAX_INDEX
000001C0  2          THEN (* We've overflowed the file *)
000001C0  2            FMGR_CODE := 5
000001CC  2          ELSE (* It will fit in file *)
000001CC  2            BEGIN (* Write next record *)
000001CC  2              (* Set record length *)
000001CC  2              MEMORY_FILE [ CURRENT_LOC ] := SHIFT ( SHIFT ( MEMORY_FILE
000001CC  2                   [ CURRENT_LOC ], -8 ), 8 ) + ACT_LENGTH;
000001EE  2              (* Ship the stuff to the trace file *)
000001EE  2              MOVE_WORDS ( ACT_LENGTH, ADDR ( RBUF [ 1 ] ),
000001EE  2                           ADDR ( MEMORY_FILE [ CURRENT_LOC+1 ] ) );
0000021A  2              (* Update my indeces/counters *)
0000021A  2              CURRENT_REC := CURRENT_REC + 1;
0000021E  2              CURRENT_LOC := CURRENT_LOC + ACT_LENGTH + 1;
0000022E  2              (* Set previous record length, 0 out next record length *)
0000022E  2              MEMORY_FILE [ CURRENT_LOC ] := SHIFT ( ACT_LENGTH, 8 )
00000240  2            END (* Write next record *)
00000240  2  END; (* Procedure M_WRITE *)
00000000  1  $GLOBPROC OFF$
00000000  1
00000000  1
00000000  1
00000000  1
00000000  1
00000000  1  (*
00000000  1                          ****************************
00000000  1                          ***** M_WRITEBACKWARD *****
00000000  1                          ****************************
00000000  1                                                                          *)
00000000  1  $GLOBPROC ON$
00000000  1  PROCEDURE M_WRITEBACKWARD ( VAR DCB:  DCB_TYPE; VAR RBUF:  REC_TYPE; VAR
00000000  2                              FMGR_CODE:  S_INT );
00000000  2  (*
00000000  2    Procedure M_WRITEBACKWARD to "writebackward" to the trace memory
00000000  2    file  Procedure writes the given record if it will fit in the
00000000  2    memory file.
00000000  2
00000000  2    Input:  1) DCB, the file's data control block ( not used )
00000000  2            2) RBUF, the end of the buffer to be written out, with the
00000000  2               length in the upper byte of the end word
00000000  2    Output:  1) FMGR_CODE, a code specifying how the write turned out:
00000000  2                0 indicates no error:  previous record written
00000000  2                5 indicates file full
00000000  2                                                                          *)
00000000  2  VAR
00000000  2
00000000  2    ACT_LENGTH:  S_INT; (* Word length of record to write *)
00000248  2
00000248  2  BEGIN (* Procedure M_WRITEBACKWARD *)
00000248  2    FMGR_CODE := 0;
0000024E  2    ACT_LENGTH := SHIFT ( RBUF [ 0 ], -8 );
0000025A  2    IF ACT_LENGTH <> 0
00000260  2      THEN (* He actually wants to write to the file *)
00000260  2        IF ( CURRENT_LOC-ACT_LENGTH-1 ) < 0
00000270  2          THEN (* We've underflowed the file *)
00000270  2            FMGR_CODE := 5
0000027C  2          ELSE (* It will fit in file *)
0000027C  2            BEGIN (* Write previous record *)
0000027C  2              (* Use existing record length so we don't screw up file *)
0000027C  2              ACT_LENGTH := SHIFT ( MEMORY_FILE [ CURRENT_LOC ], -8 );
00000292  2              (* Ship the stuff to the trace file *)
00000292  2              MOVE_WORDS ( ACT_LENGTH, ADDR ( RBUF [ -ACT_LENGTH ] ),
00000292  2                   ADDR ( MEMORY_FILE [ CURRENT_LOC-ACT_LENGTH ] ) );
000002C0  2              (* Update my indeces/counters *)
000002C0  2              CURRENT_REC := CURRENT_REC - 1;
000002C4  2              CURRENT_LOC := CURRENT_LOC - ACT_LENGTH - 1
000002D6  2            END (* Write previous record *)
000002D6  2  END; (* Procedure M_WRITEBACKWARD *)
00000000  1  $GLOBPROC OFF$
00000000  1
00000000  1
00000000  1
```

```
00000000  1
00000000  1
00000000  1  (*
00000000  1                         ***********************
00000000  1                         ***** M_POSITION *****
00000000  1                         ***********************
00000000  1                                                                   *)
00000000  1  $GLOBPROC ONS
00000000  1  PROCEDURE M_POSITION ( VAR DCB:  DCB_TYPE; RECN:  S_INT; VAR FMGR_CODE:
00000000  2                         S_INT );
00000000  2  (*
00000000  2    Procedure M_POSITION to "position" in the trace memory file.  The
00000000  2    appropriate pointers are moved to the indicated record.
00000000  2
00000000  2    Input:  1) DCB, the file's data control block ( not used )
00000000  2            2) RECN, the record # to position to
00000000  2    Output:  1) FMGR_CODE, a code specifying how the position turned out:
00000000  2                0 indicates no error:  record positioned to
00000000  2                1 indicates end of file
00000000  2                                                                   *)
00000000  2  VAR
00000000  2
00000000  2    RECS_LEFT:  S_INT; (* Number of records left to move *)
00000002  2
00000002  2    ACT_LENGTH:  S_INT; (* Length of next record to move past *)
000002DE  2
000002DE  2  BEGIN (* Procedure M_POSITION *)
000002DE  2    FMGR_CODE := 0;
000002E4  2    RECS_LEFT := CURRENT_REC - RECN;
000002F0  2    WHILE ( RECS_LEFT <> 0 ) AND ( FMGR_CODE = 0 ) DO
0000030C  2      IF RECS_LEFT > 0
00000314  2        THEN (* Moving back in file *)
00000314  2          BEGIN (* Move backward one record *)
00000314  2            ACT_LENGTH := SHIFT ( MEMORY_FILE [ CURRENT_LOC ], -8 );
0000032A  2            IF ACT_LENGTH = 0
00000330  2              THEN (* At beginning of file *)
00000330  2                FMGR_CODE := 1
0000033C  2              ELSE (* Not at beginning *)
0000033C  2                BEGIN (* Move *)
0000033C  2                  CURRENT_LOC := CURRENT_LOC - ACT_LENGTH - 1;
0000034E  2                  CURRENT_REC := CURRENT_REC - 1;
00000352  2                  RECS_LEFT := RECS_LEFT - 1
00000356  2                END (* Move *)
00000356  2          END (* Move backward one record *)
0000035A  2        ELSE (* Moving forward in file *)
0000035A  2          BEGIN (* Move forward one record *)
0000035A  2            ACT_LENGTH := SHIFT ( SHIFT ( MEMORY_FILE [ CURRENT_LOC ],
0000035A  2                          8 ), -8 );
00000372  2            IF ACT_LENGTH = 0
00000378  2              THEN (* At end of file *)
00000378  2                FMGR_CODE := 1
00000384  2              ELSE (* Not at end *)
00000384  2                BEGIN (* Move *)
00000384  2                  CURRENT_LOC := CURRENT_LOC + ACT_LENGTH + 1;
00000394  2                  CURRENT_REC := CURRENT_REC + 1;
00000398  2                  RECS_LEFT := RECS_LEFT + 1
0000039C  2                END (* Move *)
0000039C  2          END (* Move forward one record *)
000003A0  2  END; (* Procedure M_POSITION *)
00000000  1  $GLOBPROC OFFS
00000000  1
00000000  1
00000000  1
00000000  1
00000000  1
00000000  1  (*
00000000  1                         ********************
00000000  1                         ***** M_CLOSE *****
00000000  1                         ********************
00000000  1                                                                   *)
00000000  1  $GLOBPROC ONS
00000000  1  PROCEDURE M_CLOSE ( VAR DCB:  DCB_TYPE; VAR FMGR_CODE:  S_INT );
000003A8  2  (*
000003A8  2    Procedure M_CLOSE to "close" the trace memory file.
```

```
000003A8  2
000003A8  2    Input:  1) DCB, the file's data control block ( not used )
000003A8  2    Output:  1) FMGR_CODE, a code specifying how the close turned out
000003A8  2                0 indicates no error:  memory file closed
000003A8  2                no errors are possible
000003A8  2                                                                   *)
000003A8  2  BEGIN (* Procedure M_CLOSE *)
000003A8  2    FMGR_CODE := 0 (* Nothing to do *)
000003AE  2  END; (* Procedure M_CLOSE *)
00000000  1  $GLOBPROC OFF$
00000000  1
00000000  1
00000000  1
00000000  1
00000000  1
00000000  1  (*
00000000  1                              ********************
00000000  1                              ***** M_DELETE *****
00000000  1                              ********************
00000000  1                                                                   *)
00000000  1  $GLOBPROC ON$
00000000  1  PROCEDURE M_DELETE ( VAR FNAME:  FNAME_ARRAY; FTYPE, DISC:  S_INT; VAR
00000000  2                       DCB:  DCB_TYPE; VAR FMGR_CODE:  S_INT );
000003B6  2  (*
000003B6  2    Procedure M_DELETE to "delete" the trace memory file.
000003B6  2
000003B6  2    Input:  1) FNAME, the file name to be opened ( not used )
000003B6  2            2) FTYPE, the file type to open ( not used )
000003B6  2            3) DISC, the disc on which to open the file ( not used )
000003B6  2            4) DCB, the file's data control block ( not used )
000003B6  2    Output:  1) FMGR_CODE, a code specifying how the open turned out:
000003B6  2                0 indicates no error:  memory file deleted
000003B6  2                no errors are possible
000003B6  2                                                                   *)
000003B6  2  BEGIN (* Procedure M_DELETE *)
000003B6  2    FMGR_CODE := 0 (* Nothing to do *)
000003BC  2  END; (* Procedure M_DELETE *)
00000000  1  $GLOBPROC OFF$
00000000  1
00000000  1
00000000  1
00000000  1
00000000  1
00000000  1  (*
00000000  1                              **********************
00000000  1                              ***** M_FILE_ERR *****
00000000  1                              **********************
00000000  1                                                                   *)
00000000  1  $GLOBPROC ON$
00000000  1  PROCEDURE M_FILE_ERR ( VAR DCB:  DCB_TYPE; FMGR_CODE: S_INT );
000003C4  2  (*
000003C4  2    Procedure M_FILE_ERR to output an appropriate trace memory
000003C4  2    file error message.  Currently, only one generic message is output.
000003C4  2
000003C4  2    Input:  1) DCB, the file's data control block ( not used )
000003C4  2            2) FMGR_CODE, the error code for which a message is to be
000003C4  2               output ( currently not used )
000003C4  2    Output:  none
000003C4  2                                                                   *)
000003C4  2  BEGIN (* Procedure M_FILE_ERR *)
000003C4  2    P_MESSAGE ( MTF_ERROR, CLR_ERROR_MSG )
000003D4  2  END; (* Procedure M_FILE_ERR *)
00000000  1  $GLOBPROC OFF$
00000000  1
00000000  1
00000000  1
00000000  1
00000000  1
00000000  1  (*
00000000  1                              **********************
00000000  1                              ***** READRECNUM *****
00000000  1                              **********************
00000000  1                                                                   *)
00000000  1  $GLOBPROC ON$
```

```
00000000  1  PROCEDURE READRECNUM ( VAR DCB:  DCB_TYPE; VAR REC_NUM, FMGR_CODE:
00000000  2                           S_INT );
000003DC  2  (*
000003DC  2    Procedure READRECNUM to determine the current record position in
000003DC  2    the memory file.
000003DC  2
000003DC  2    Input:  1) DCB, the file's data control block ( not used )
000003DC  2    Output:  1) REC_NUM, the current record number
000003DC  2             2) FMGR_CODE, a code specifying how the write turned out:
000003DC  2                0 indicates no error:  current record # returned
000003DC  2                no errors are possible
000003DC  2                                                                      *)
000003DC  2  BEGIN (* Procedure READRECNUM *)
000003DC  2    FMGR_CODE := 0;
000003E2  2    REC_NUM := CURRENT_REC (* Return the current record number *)
000003EA  2  END; (* Procedure READRECNUM *)
00000000  1  $GLOBPROC OFF$
00000000  1
00000000  1
00000000  1
00000000  1
00000000  1
00000000  1  (*
00000000  1                          ***********************
00000000  1                          ***** TRACE_SIZE *****
00000000  1                          ***********************
00000000  1                                                                      *)
00000000  1  $GLOBPROC ON$
00000000  1  FUNCTION TRACE_SIZE:  L_INT;
000003F2  2  (*
000003F2  2    Function TRACE_SIZE to return the number of words left in the trace
000003F2  2    file.
000003F2  2
000003F2  2    Input:  none
000003F2  2    Output:  1) the number of words left in the trace file, in function
000003F2  2               name
000003F2  2                                                                      *)
000003F2  2  BEGIN (* Function TRACE_SIZE *)
000003F2  2    TRACE_SIZE := MAX_INDEX - CURRENT_LOC + 1
00000402  2  END; (* Function TRACE_SIZE *)
00000000  1  $GLOBPROC OFF$
00000000  1  .
```

End of compilation, number of errors=    0

```
LOCATION OBJECT CODE LINE     SOURCE LINE

                         "68000"
                         *
                         *  Tabs at 5, 15, 35
                         *
                              GLOBAL MOVE_WORDS
                         *
                         ******************************* MOVE_WORDS *******************************
                         *  MOVE_WORDS moves a given number of words from one location in
                         *  memory to another.
                         *  Author:  Kip Fulghum
                         *  Date:  3-28-84  Revised:  3-28-84
                         **************************************************************************
                         *
                         *
                         *  Declaration:
                         *
                         *  PROCEDURE MOVE_WORDS ( NUM:  S_INT; FFROM, TTO:  S_INT_PTR );
                         *                          EXTERNAL;
                         *
                         *  Input:  1) NUM, the number of words to be transferred
                         *          2) FFROM, the address of the source
                         *          3) TTO, the address of the destination
                         *
                         *  Output:  none
                         *
000000                   MOVE_WORDS
                         *  BEGIN  ( Procedure MOVE_WORDS
```

```
000000 302F 000C          MOVE.W    12(A7),D0          ; Get # words to move.
000004 206F 0008          MOVEA.L   8(A7),A0           ; Get source address.
000008 226F 0004          MOVEA.L   4(A7),A1           ; Get destination address.
                       *
                       *  Start at bottom of loop so we handle 0 move count AND the
                       *  fact that the DBcc instruction counts to -1.
                       *
00000C 6002               BRA.S     START_LOOP
00000E                 MOVE_LOOP
00000E 32D8               MOVE.W    (A0)+,(A1)+        ; Move a word.
000010                 START_LOOP
000010 51C8 FFFC          DBF       D0,MOVE_LOOP       ; Repeat if not done.
000014 4E75               RTS                         ,; Return to calling program.
                       *  END   < Procedure MOVE_WORDS
                          END

Errors=    0
```

```
LOCATION OBJECT CODE LINE     SOURCE LINE

                        "68000"
                        *
                        *  Tabs at 5, 15, 35
                        *
                            GLOBAL MTF_ERROR
                        *
                        ****************************** TRACE_ASVM ********************************
                        *  TRACE_ASVM supplies the necessary ascii strings for the trace memory
                        *  file manager.  Module contains all message strings, etc. required
                        *  for errors, etc.
                        *  Author   Kip Fulghum
                        *  Date:  3-30-84  Revised:  6-4-84
                        **************************************************************************
                        *
                            DATA
000000                  MTF_ERROR
000000 00000004             DC.L      FILE_ERROR
000004                  FILE_ERROR
000004 0012                 DC.W      18
000006 46696C6520           ASC       "File error, file = footdc:HP:memory "
                            END

Errors=    0
```

```
00000000  1  "68000" PREPROCESS
00000000  1  $EXTENSIONS ON$
00000000  1  $LIB_ABS_LONGS
00000000  1  $TITLE "Soda Dynamic/Static Controller Emul. Utilities"
00000000  1  PROGRAM EMUL_UTLS;
00000000  1  (*
00000000  1  ******************************** EMUL_UTLS ********************************
00000000  1    EMUL_UTLS is the module containing emulation related routines for the
00000000  1    Dynamic and Static Controllers that are processor specific.  These
00000000  1    routines are responsible for accessing emulation memory to read/write/
00000000  1    compare variable values, etc.  In other words, EMUL_UTLS contains
00000000  1    processor dependent code.
00000000  1    Author:  Kip Fulghum
00000000  1    Date:  7-26-83  Revised:  1-3-85
00000000  1  ***************************************************************************
00000000  1
00000000  1    EMUL_UTLS contains the following routines:
00000000  1    -Procedure VAR_ADRS_SIZE determines the logical address, stack,
00000000  1     and size of a variable.
00000000  1    -Global procedure LOAD_VARIABLE loads a given variable in emulation
00000000  1     memory with a given value.
00000000  1    -Global procedure UNLOAD_VARIABLE unloads a given variable from
00000000  1     emulation memory.
00000000  1    -Global procedure COMPARE_VARIABLE compares the value of a given
00000000  1     variable with a given value.
00000000  1
00000000  1    In addition, EMUL_UTLS uses the following external routines:
00000000  1    READ_MEM, WRITE_MEM, TEST_BITS, WRITE_VAR_REC, UNLOAD_DONE,
00000000  1    and P_ADDR.
00000000  1                                                                        *)
00000000  1
00000000  1  CONST
```

```
00000000  1
00000000  1  (*
00000000  1                 *********************************************
00000000  1                 ***** Generic Unload Status Constants *****
00000000  1                 *********************************************
00000000  1                                                                    *)
00000000  1
00000000  1    DATA_WRD_RD = 8010H; (* User data word read.  Upper bit indicates
00000000  1                            memory read *) ,
00000000  1
00000000  1    DATA_UPB_RD = 8016H; (* User data upper byte read. Upper bit indicates
00000000  1                            memory read *)
00000000  1
00000000  1  (*
00000000  1                       **************************
00000000  1                       ***** Include Files *****
00000000  1                       **************************
00000000  1                                                                    *)
00000000  1
00000000  1  #INCLUDE ER_CONST:SS_DYN
00000000  1
00000000  1  #INCLUDE COM_TYPES:SS_DYN
00000000  1
00000000  1  #INCLUDE UNLD_TYPES:SS_DYN
00000000  1
00000000  1  #INCLUDE ICMD_DATA:SODAMQN
00000000  1
00000000  1
00000000  1
00000000  1
00000000  1
00000000  1  $CALL_ABS_LONGS
00000000  1  (*
00000000  1                         *********************
00000000  1                         ***** READ_MEM *****
00000000  1                         *********************
00000000  1                                                                    *)
00000000  1  PROCEDURE READ_MEM ( ADDRESS:  L_INT; COUNT:  S_INT; VAR LOC:  L_INT;
00000000  2                        VAR ERROR:  S_INT ); EXTERNAL;
00000000  1  (*
00000000  1    Procedure READ_MEM to read the specified location(s) in emulation
00000000  1    memory.  The address location is to be logical and given as MSW,
00000000  1    then LSW.  Provided as a part of the message handler.
00000000  1                                                                    *)
00000000  1
00000000  1
00000000  1
00000000  1
00000000  1
00000000  1  (*
00000000  1                         **********************
00000000  1                         ***** WRITE_MEM *****
00000000  1                         **********************
00000000  1                                                                    *)
00000000  1  PROCEDURE WRITE_MEM ( ADDRESS:  L_INT; COUNT:  S_INT; VAR LOC:  L_INT;
00000000  2                         VAR ERROR:  S_INT; TYPE_MEM:  S_INT ); EXTERNAL;
00000000  1  (*
00000000  1    Procedure WRITE_MEM to write to the specified location(s) in emulation
00000000  1    memory.  The address location is to be logical and given as MSW,
00000000  1    then LHS.  Provided as a part of the message handler.
00000000  1                                                                    *)
00000000  1
00000000  1
00000000  1
00000000  1
00000000  1
00000000  1  $CALL_PC_SHORTS
00000000  1  (*
00000000  1                         **********************
00000000  1                         ***** TEST_BITS *****
00000000  1                         **********************
00000000  1                                                                    *)
00000000  1  FUNCTION TEST_BITS ( BIT_WORD, TEST_WORD:  L_INT ):  BOOLEAN; EXTERNAL;
00000000  1  (*
```

```
00000000  1    Function TEST_BITS to see if all of the bits indicated in BIT_WORD
00000000  1    are set in TEST_WORD, ie "AND" both words and see if the result is
00000000  1    equal to BIT_WORD.  Provided as an assembly language external.
00000000  1                                                                      *)
00000000  1
00000000  1
00000000  1
00000000  1
00000000  1
00000000  1  (*
00000000  1                          ***************************
00000000  1                          ***** WRITE_VAR_REC *****
00000000  1                          ***************************
00000000  1                                                                      *)
00000000  1  PROCEDURE WRITE_VAR_REC ( D_TYPE, INDEX:  S_INT; N_FIELD:  L_INT; VAR
00000000  2                          SEX_REC:  SEXTET_REC_TYPE; VAR TWIN_INDIRECTS.
00000000  2                          TWIN_I_TYPE; VAR REC_COUNT, FNGR_CODE:
00000000  2                          S_INT ); EXTERNAL;
00000000  1  (*
00000000  1    Procedure WRITE_VAR_REC to create and write a trace file variable
00000000  1    analysis record to the disc.  Provided as a Pascal external.
00000000  1                                                                      *)
00000000  1
00000000  1
00000000  1
00000000  1
00000000  1
00000000  1  (*
00000000  1                          *************************
00000000  1                          ***** UNLOAD_DONE *****
00000000  1                          *************************
00000000  1                                                                      *)
00000000  1  FUNCTION UNLOAD_DONE ( COUNT:  S_INT ):  BOOLEAN; EXTERNAL;
00000000  1  (*
00000000  1    Function UNLOAD_DONE to determine when the unload sequence is done.
00000000  1    Provided as a Pascal external.
00000000  1                                                                      *)
00000000  1
00000000  1
00000000  1
00000000  1
00000000  1
00000000  1  (*
00000000  1                          *******************
00000000  1                          ***** P_ADDR *****
00000000  1                          *******************
00000000  1                                                                      *)
00000000  1  PROCEDURE P_ADDR ( LOGICAL_ADDR:  L_INT; VAR PHYSICAL_ADDR:  L_INT );
00000000  2                     EXTERNAL;
00000000  1  (*
00000000  1    Procedure P_ADDR to return the physical address equivalent of the
00000000  1    given logical address.  Provided as a Pascal external.
00000000  1                                                                      *)
00000000  1
00000000  1
00000000  1
00000000  1
00000000  1
00000000  1  (*
00000000  1                          ***************************
00000000  1                          ***** VAR_ADRS_SIZE *****
00000000  1                          ***************************
00000000  1                                                                      *)
00000000  1  PROCEDURE VAR_ADRS_SIZE ( VAR PROC_REC, VAR_REC, OFST_REC:
00000000  2                          CMD_DATA_TYPE; VAR FRAME_REC:  FRAME_REC_TYPE;
00000000  2                          VAR V_ADRS, V_SIZE, V_STACK:  L_INT; VAR
00000000  2                          V_INDIRECTS:  I_INFO_TYPE; VAR V_TYPE,
00000000  2                          VAR_CODE:  S_INT );
00000000  2  (*
00000000  2    Procedure VAR_ADRS_SIZE to determine the logical address, stack, and
00000000  2    size of the given variable with the given indirects with the given
00000000  2    frame ( a lot of givens:  must be a big family ).  Procedure uses the
00000000  2    frame to determine the correct stack address ( if necessary ), then
00000000  2    follows all levels of indirection ( again, if necessary ) to get to
```

```
00000000  2    the variable.  This final address, stack, size, and type of variable
00000000  2    are returned to the caller, along with the collected indirect
00000000  2    information.  VAR_ADRS_SIZE assumes that the emulator is running in
00000000  2    the monitor.
00000000  2
00000000  2    VAR_ADRS_SIZE uses the following routines:  READ_MEM and TEST_BITS.
00000000  2
00000000  2    Input:  1) PROC_REC, the record in the measurement structure
00000000  2               describing the procedure in which we are broken
00000000  2               - Not used for static variables
00000000  2               ( not used at all for the 68000 )
00000000  2            2) VAR_REC, the record in the measurement structure describing
00000000  2               the variable
00000000  2            3) OFST_REC, the record in the measurement structure
00000000  2               describing the offsets for the variable
00000000  2               - Not used for variables requiring 0 levels of indirection
00000000  2            4) FRAME_REC, the correct logical frame for the variable
00000000  2               - Only segment info is used if static variable
00000000  2    Output:  1) V_ADRS, the logical address of the variable
00000000  2             2) V_SIZE, the size in bytes of the variable
00000000  2             3) V_STACK, the logical stack address, 0 if static variable
00000000  2             4) V_INDIRECTS, a record containing the logical indirect
00000000  2                information and the number of levels of indirection
00000000  2             5) V_TYPE, the type of the variable ( ie static, dynamic,
00000000  2                etc )
00000000  2             6) VAR_CODE, a return code specifying what happened:
00000000  2                -26 indicates emulation error
00000000  2                -19 indicates variable not found
00000000  2                 -2 indicates measurement descriptor is corrupt
00000000  2                  0 indicates no error:  variable unloaded
00000000  2                                                                              *)
00000000  2  VAR
00000000  2
00000000  2    I:  S_INT; (* Multiple WHILE loop index *)
00000002  2
00000002  2    EMUL_CODE:  S_INT; (* Return code from emulator *)
00000004  2
00000004  2  BEGIN (* Procedure VAR_ADRS_SIZE *)
00000004  2    VAR_CODE := NO_ERROR;
0000000A  2    IF TEST_BITS ( 8, VAR_REC.FLAGS ) = FALSE
0000002A  2      THEN (* This variable is static *)
0000002A  2        BEGIN (* Set up for static var *)
0000002A  2          V_TYPE := STATIC_VAR;
00000032  2          V_STACK := 0
00000038  2        END (* Set up for static var *)
0000003C  2      ELSE (* This variable is dynamic *)
0000003C  2        BEGIN (* Set up for dynamic var:  find stack adrs *)
0000003C  2          V_TYPE := DYNAMIC_VAR;
00000044  2          V_STACK := -1;
0000004E  2          I := 0;
00000052  2          WHILE ( FRAME_REC.FRAME [ I ].SUBNO <> 0 ) AND
00000052  2                ( V_STACK = -1 ) DO
00000084  2            BEGIN (* Find correct stack adrs *)
00000084  2              IF FRAME_REC.FRAME [ I ].SUBNO = VAR_REC.PROC_NUM
000000A0  2                THEN (* Found the correct stack address *)
000000AC  2                  V_STACK := FRAME_REC.FRAME [ I ].STACK_ADRS;
000000B8  2              I := I + 1
000000BC  2            END; (* Find correct stack adrs *)
000000BE  2          IF V_STACK = -1
000000CE  2            THEN (* No associated stack address *)
000000CE  2              VAR_CODE := VAR_NOT_FOUND
000000D6  2        END; (* Set up for dynamic var:  find stack adrs *)
000000D6  2    IF ( VAR_CODE = NO_ERROR ) AND ( VAR_REC.SIZE = -1 )
000000FC  2      THEN (* This variable requires indirection *)
000000FC  2        BEGIN (* Follow levels of indirection to get address and size *)
000000FC  2          V_ADRS := V_STACK;
00000106  2          I := 0;
0000010A  2          (* Determine final V_ADRS *)
0000010A  2          WHILE ( OFST_REC.SIZES [ I ] <> -1 ) AND
0000010A  2                ( VAR_CODE = NO_ERROR ) DO
0000013A  2            BEGIN (* Get to the logical variable location *)
0000013A  2              (* Add in offset to get to next indirection *)
0000013A  2              V_ADRS := V_ADRS + OFST_REC.OFFSETS [ I ];
0000014E  2              IF OFST_REC.SIZES [ I+1 ] <> -1
```

```
0000016C  2             THEN (* This is not the last level of indirection *)
0000016C  2               BEGIN (* Move to next level *)
0000016C  2                 (* Remember ptr address after adding in offset *)
0000016C  2                 V_INDIRECTS.LEVELS [ I ].PTR_ADRS := V_ADRS;
00000182  2                 READ_MEM ( V_ADRS, 4, V_ADRS, EMUL_CODE );
000001A2  2                 V_INDIRECTS.LEVELS [ I ].PTR_DATA := V_ADRS;
000001BC  2                 IF EMUL_CODE <> 0
000001C4  2                   THEN (* Emulation burst the bubble *)
000001C4  2                     VAR_CODE := EMUL_PROBLEM
000001CC  2               END; (* Move to next level *)
000001CC  2           I := I + 1
000001D0  2         END; (* Get to the logical variable location *)
000001D4  2       IF I < 2
000001E0  2         THEN (* No indirects to follow:  ignore any previous error *)
000001E0  2           VAR_CODE := CORRUPT_USER
000001EC  2         ELSE (* We followed some indirects *)
000001EC  2           BEGIN (* Set final size *)
000001EC  2             V_SIZE := OFST_REC.SIZES [ I-1 ];
00000204  2             V_INDIRECTS.NUM := I - 1
00000210  2           END (* Set final size *)
00000210  2     END (* Follow levels of indirection to get address and size *)
00000214  2   ELSE (* This variable can be accessed directly *)
00000214  2     BEGIN (* Get address and size *)
00000214  2       V_ADRS := VAR_REC.ADDRESS + V_STACK;
00000228  2       V_SIZE := VAR_REC.SIZE;
00000234  2       V_INDIRECTS.NUM := 0
0000023A  2     END (* Get address and size *)
0000023A  2 END; (* Procedure VAR_ADRS_SIZE *)
00000000  1
00000000  1
00000000  1
00000000  1
00000000  1
00000000  1 (*
00000000  1                         *************************
00000000  1                         ***** LOAD_VARIABLE *****
00000000  1                         *************************
00000000  1                                                                 *)
00000000  1 $GLOBPROC ON$
00000000  1 PROCEDURE LOAD_VARIABLE ( VAR PROC_REC, VAR_REC, OFST_REC, VALUE_REC:
00000000  2                           CMD_DATA_TYPE; VAR FRAME_REC:  FRAME_REC_TYPE;
00000000  2                           VAR LD_CODE:  S_INT );
00000000  2 (*
00000000  2   Procedure LOAD_VARIABLE to load a given variable in emulation memory
00000000  2   with a given value.  Procedure uses VAR_ADRS_SIZE to find out the
00000000  2   variable's logical address, size, stack address, and type.  If the
00000000  2   size <= 4 bytes, the given value is written to the variable's
00000000  2   location one byte/word at a time, whichever is appropriate.
00000000  2   LOAD_VARIABLE assumes that the emulator is running in the monitor.
00000000  2
00000000  2   LOAD_VARIABLE uses the following routines:  VAR_ADRS_SIZE and
00000000  2   WRITE_MEM.
00000000  2
00000000  2   Input:  1) PROC_REC, the record in the measurement structure
00000000  2              describing the procedure in which we are broken
00000000  2              - Not used for static variables
00000000  2              ( not used at all for the 68000 )
00000000  2           2) VAR_REC, the record in the measurement structure describing
00000000  2              the variable to be loaded
00000000  2           3) OFST_REC, the record in the measurement structure
00000000  2              describing the offsets for the variable
00000000  2              - Not used for variables requiring 0 levels of indirection
00000000  2           4) VALUE_REC, the record in the measurement structure
00000000  2              describing the value to be given to the variable
00000000  2           5) FRAME_REC, the correct logical frame for the variable
00000000  2              - Only segment info is used if static variable
00000000  2   Output:  1) LD_CODE, a return code specifying what happened:
00000000  2                -26 indicates emulation error
00000000  2                -19 indicates variable not found
00000000  2                 -2 indicates measurement structure is corrupt
00000000  2                  0 indicates no error:  variable loaded
00000000  2                                                                 *)
00000000  2 VAR
00000000  2
```

```
00000000  2    EMUL_CODE:  S_INT; (* Return code from emulator *)
00000002  2
00000002  2    TYPE_VAR:  S_INT; (* Type of variable *)
00000004  2
00000004  2    CUR_VALUE:  L_INT; (* Value to be loaded *)
00000008  2
00000008  2    CUR_ADRS:  L_INT; (* Current load address *)
0000000C  2
0000000C  2    CUR_SIZE:  L_INT; (* Size of variable *)
00000010  2
00000010  2    STACK:  L_INT; (* Stack address *)
00000014  2
00000014  2    INDIRECT:  I_INFO_PTR; (* Ptr to indirect information *)
00000242  2
00000242  2  BEGIN (* Procedure LOAD_VARIABLE *)
00000242  2    NEW ( INDIRECT ); (* Create indirect information record *)
00000254  2    (* Get a lot of useful info about this variable *)
00000254  2    VAR_ADRS_SIZE ( PROC_REC, VAR_REC, OFST_REC, FRAME_REC, CUR_ADRS,
00000254  2                    CUR_SIZE, STACK, INDIRECT^, TYPE_VAR, LD_CODE );
00000292  2    IF ( LD_CODE = NO_ERROR ) AND ( CUR_SIZE > 4 )
000002B4  2      THEN (* Problems:  can't write such a large variable *)
000002B4  2        LD_CODE := CORRUPT_USER;
000002BC  2    IF LD_CODE = NO_ERROR
000002C6  2      THEN (* Variable size is something I can handle *)
000002C6  2        BEGIN (* Write variable into memory *)
000002C6  2          CASE CUR_SIZE OF
000002CE  2            1:  (* Byte variable *)
000002CE  2              (* Shift value to upper byte *)
000002CE  2              CUR_VALUE := SHIFT ( VALUE_REC.VAL_VALUE, 24 );
000002E6  2            2:  (* Word variable *)
000002E6  2              (* Shift value to upper word *)
000002E6  2              CUR_VALUE := SHIFT ( VALUE_REC.VAL_VALUE, 16 );
000002FE  2            3:  (* Word and 1/2 variable *)
000002FE  2              (* Shift value up a byte *)
000002FE  2              CUR_VALUE := SHIFT ( VALUE_REC.VAL_VALUE, 8 );
00000310  2           OTHERWISE (* Long word *)
00000310  2              (* Leave it alone *)
00000310  2              CUR_VALUE := VALUE_REC.VAL_VALUE
0000031A  2          END; (* Of case statement *)
00000340  2          WRITE_MEM ( CUR_ADRS, CUR_SIZE, CUR_VALUE, EMUL_CODE, 0 );
00000360  2          IF EMUL_CODE <> 0
00000368  2            THEN (* Emulation swallowed something the wrong way *)
00000368  2              LD_CODE := EMUL_PROBLEM
00000370  2        END; (* Write variable into memory *)
00000370  2    DISPOSE ( INDIRECT ) (* Return indirect record to heap *)
00000382  2  END; (* Procedure LOAD_VARIABLE *)
00000000  1  $GLOBPROC OFF$
00000000  1
00000000  1
00000000  1
00000000  1
00000000  1
00000000  1  (*
00000000  1                        *****************************
00000000  1                        ***** UNLOAD_VARIABLE *****
00000000  1                        *****************************
00000000  1                                                                      *)
00000000  1  $GLOBPROC ON$
00000000  1  PROCEDURE UNLOAD_VARIABLE ( VAR PROC_REC, VAR_REC, OFST_REC:
00000000  2                             CMD_DATA_TYPE; VAR FRAME_REC:
00000000  2                             FRAME_REC_TYPE; SYM_INDEX:  S_INT;
00000000  2                             P_COUNTER:  L_INT; VAR REC_COUNT,
00000000  2                             UNLD_CODE:  S_INT );
00000000  2  (*
00000000  2    Procedure UNLOAD_VARIABLE to unload a given variable from emulation
00000000  2    memory and write it out to the trace file.  Procedure uses
00000000  2    VAR_ADRS_SIZE to find out the variable's logical address, size, stack
00000000  2    address, and type.  It then reads it out a byte/word at at time,
00000000  2    whichever is appropriate, and writes a variable record to the trace
00000000  2    file.  This is repeated until the entire variable is unloaded.
00000000  2    UNLOAD_VARIABLE assumes that the emulator is running in the monitor.
00000000  2
00000000  2    UNLOAD_VARIABLE uses the following routines:  VAR_ADRS_SIZE, READ_MEM,
00000000  2    WRITE_VAR_REC, UNLOAD_DONE, and P_ADDR.
```

```
00000000  2
00000000  2    Input:  1) PROC_REC, the record in the measurement structure
00000000  2               describing the procedure in which we are broken
00000000  2               - Not used for static variables
00000000  2               ( not used at all for the 68000 )
00000000  2            2) VAR_REC, the record in the measurement structure describing
00000000  2               the variable to be unloaded
00000000  2            3) OFST_REC, the record in the measurement structure
00000000  2               describing the offsets for the variable
00000000  2               - Not used for variables requiring 0 levels of indirection
00000000  2            4) FRAME_REC, the correct logical frame for the variable
00000000  2               - Only segment info is used if static variable
00000000  2            5) SYM_INDEX, the index into the symbol table of the variable
00000000  2            6) P_COUNTER, the physical program counter associated with
00000000  2               this access to the variable
00000000  2            7) REC_COUNT, the current number of trace records written to
00000000  2               the trace file
00000000  2    Output:  1) REC_COUNT, the updated number of trace records
00000000  2             2) UNLD_CODE, a return code specifying what happened:
00000000  2                 -26 indicates emulation error
00000000  2                 -19 indicates variable not found
00000000  2                  -2 indicates measurement descriptor is corrupt
00000000  2                   0 indicates no error:  variable unloaded
00000000  2                   3 indicates file not found:  invalid DCB ( should never
00000000  2                     happen )
00000000  2                   5 indicates no free pages available
00000000  2                   7 indicates file corrupt
00000000  2                                                                    *)
00000000  2  VAR
00000000  2
00000000  2    EMUL_CODE:  S_INT; (* Return code from emulator *)
00000002  2
00000002  2    TYPE_VAR:  S_INT; (* Type of variable *)
00000004  2
00000004  2    CUR_DATA:  L_INT; (* Current unloaded data *)
00000008  2
00000008  2    CUR_INDEX:  S_INT; (* Current symbol index *)
0000000A  2
0000000A  2    CUR_ADRS:  L_INT; (* Current unload address *)
0000000E  2
0000000E  2    CUR_SIZE:  L_INT; (* Size of variable *)
00000012  2
00000012  2    MAX_ADRS:  L_INT; (* Maximum unload address *)
00000016  2
00000016  2    STACK:  L_INT; (* Stack address *)
0000001A  2
0000001A  2    SEX_REC:  SEXTET_REC_TYPE; (* Storage for "unloaded" state *)
00000030  2
00000030  2    INDIRECT:  I_INFO_PTR; (* Ptr to indirect information *)
00000034  2
00000034  2    TWIN_I:  TWIN_I_TYPE; (* Ptrs to indirect info for both bytes *)
0000038A  2
0000038A  2  BEGIN (* Procedure UNLOAD_VARIABLE *)
0000038A  2    (* Start a fake "unloaded" state *)
0000038A  2    SEX_REC.COUNT [ 0 ] := 0;
0000038E  2    SEX_REC.COUNT [ 1 ] := 0;
00000392  2    SEX_REC.PC := P_COUNTER;
00000398  2    NEW ( INDIRECT ); (* Create indirect information record *)
000003AA  2    (* Get a lot of useful info about this variable *)
000003AA  2    VAR_ADRS_SIZE ( PROC_REC, VAR_REC, OFST_REC, FRAME_REC, CUR_ADRS,
000003AA  2                    CUR_SIZE, STACK, INDIRECT^, TYPE_VAR, UNLD_CODE );
000003E8  2    TWIN_I.HI_I := INDIRECT;
000003EE  2    MAX_ADRS := CUR_ADRS + CUR_SIZE - 1;
000003FC  2    WHILE ( UNLD_CODE = NO_ERROR ) AND ( CUR_ADRS <= MAX_ADRS ) AND
000003FC  2          ( UNLOAD_DONE ( REC_COUNT ) = FALSE ) DO
00000434  2      BEGIN (* Read the variable out of memory and write to file *)
00000434  2        (* Set up a fake "unloaded" state *)
00000434  2        P_ADDR ( CUR_ADRS, SEX_REC.ADRS ); (* Logical --> physical *)
00000440  2        IF ( ODD ( CUR_ADRS ) = TRUE ) OR ( MAX_ADRS = CUR_ADRS )
0000046A  2          THEN (* Odd address or last byte of variable *)
0000046A  2            BEGIN (* Read a byte *)
0000046A  2              SEX_REC.STATUS := DATA_UPB_RD;
00000470  2              READ_MEM ( CUR_ADRS, 1, CUR_DATA, EMUL_CODE );
0000048A  2              SEX_REC.DATA := S_INT ( SHIFT ( CUR_DATA, -16 ) );
```

```
0000049A  2              CUR_INDEX := SHIFT ( SYM_INDEX, 8 ) + OFFH;
000004A8  2              TWIN_I.LO_I := NIL;
000004AC  2              CUR_ADRS := CUR_ADRS + 1
000004B0  2            END (* Read a byte *)
000004B4  2          ELSE (* Even address and more than one byte *)
000004B4  2            BEGIN (* Read a word *)
000004B4  2              SEX_REC.STATUS := DATA_WRD_RD;
000004BA  2              READ_MEM ( CUR_ADRS, 2, CUR_DATA, EMUL_CODE );
000004D6  2              SEX_REC.DATA := S_INT ( SHIFT ( CUR_DATA, -16 ) );
000004E6  2              CUR_INDEX := SYM_INDEX + SHIFT ( SYM_INDEX, 8 );
000004F6  2              TWIN_I.LO_I := INDIRECT;
000004FC  2              CUR_ADRS := CUR_ADRS + 2
00000500  2            END; (* Read a word *)
00000500  2        IF EMUL_CODE = 0
00000503  2          THEN (* Read word/byte successfully *)
00000508  2            (* Ship it *)
00000508  2            WRITE_VAR_REC ( TYPE_VAR, CUR_INDEX, STACK, SEX_REC, TWIN_I,
00000508  2                            REC_COUNT, UNLD_CODE )
00000536  2          ELSE (* Problems *)
00000536  2            UNLD_CODE := EMUL_PROBLEM
0000053E  2      END; (* Read the variable out of memory and write to file *)
00000542  2    DISPOSE ( INDIRECT ) (* Return indirect record to heap *)
00000554  2  END; (* Procedure UNLOAD_VARIABLE *)
00000000  1  $GLOBPROC OFF$
00000000  1
00000000  1
00000000  1
00000000  1
00000000  1
00000000  1  (*
00000000  1                        ******************************
00000000  1                        ***** COMPARE_VARIABLE *****
00000000  1                        ******************************
00000000  1                                                                        *)
00000000  1  $GLOBPROC ON$
00000000  1  PROCEDURE COMPARE_VARIABLE ( VAR PROC_REC, VAR_REC, OFST_REC, VALUE_REC:
00000000  2                               CMD_DATA_TYPE; VAR FRAME_REC:
00000000  2                               FRAME_REC_TYPE; VAR COMPARE_CODE:  S_INT;
00000000  2                               VAR COMPARE_FLAG:  BOOLEAN );
00000000  2  (*
00000000  2   Procedure COMPARE_VARIABLE to compare the value of a given variable
00000000  2   with a given value, ie determine if the given relation ( < <=, =, >=,
00000000  2   >, <> ) is true or not.  Procedure first uses VAR_ADRS_SIZE to
00000000  2   find out the variable's logical address, size, stack, address, and
00000000  2   type.  Then, if the variable is <=4 bytes in length, it reads it out
00000000  2   a byte/word at at time, whichever is appropriate, and compares the
00000000  2   value with the given value and relational operator.  The result of
00000000  2   this comparison is returned to the caller.  COMPARE_VARIABLE assumes
00000000  2   that the emulator is running in the monitor.
00000000  2
00000000  2   Note:  the comparison is a SIGNED comparison!
00000000  2
00000000  2   COMPARE_VARIABLE uses the following routines:  VAR_ADRS_SIZE and
00000000  2   READ_MEM.
00000000  2
00000000  2   Input:  1) PROC_REC, the record in the measurement structure
00000000  2              describing the procedure in which we are broken
00000000  2              - Not used for static variables
00000000  2              ( not used at all for the 68000 )
00000000  2           2) VAR_REC, the record in the measurement structure describing
00000000  2              the variable to be compared
00000000  2           3) OFST_REC, the record in the measurement structure
00000000  2              describing the offsets for the variable
00000000  2              - Not used for variables requiring 0 levels of indirection
00000000  2           4) VALUE_REC, the record in the measurement structure
00000000  2              describing the value and type of comparison for the
00000000  2              variable
00000000  2           5) FRAME_REC, the correct logical frame for the variable
00000000  2              - Only segment info is used if static variable
00000000  2   Output:  1) COMPARE_CODE, a return code specifying what happened:
00000000  2               -26 indicates emulation error
00000000  2               -19 indicates variable not found
00000000  2                -2 indicates measurement structure is corrupt
00000000  2                 0 indicates no error:  variable comparison worked
```

```
00000000  2           2) COMPARE_FLAG, a flag indicating if the comparison was
00000000  2              true or false.  Valid ONLY if COMPARE_CODE = 0!
00000000  2                                                                      *)
00000000  2  VAR
00000000  2
00000000  2    EMUL_CODE:  S_INT; (* Return code from emulator *)
00000002  2
00000002  2    TYPE_VAR:  S_INT; (* Type of variable *)
00000004  2
00000004  2    CUR_DATA:  L_INT; (* Current unloaded data long word *)
00000008  2
00000008  2    CUR_ADRS:  L_INT; (* Current unload address *)
0000000C  2
0000000C  2    CUR_SIZE:  L_INT; (* Size of variable *)
00000010  2
00000010  2    CUR_VALUE:  L_INT; (* Shifted value to be compared against *)
00000014  2
00000014  2    STACK:  L_INT; (* Stack address *)
00000018  2
00000018  2    INDIRECT:  I_INFO_PTR; (* Ptr to indirect information *)
0000055C  2
0000055C  2  BEGIN (* Procedure COMPARE_VARIABLE *)
0000055C  2    NEW ( INDIRECT ); (* Create indirect information record *)
0000056E  2    (* Get a lot of useful info about this variable *)
0000056E  2    VAR_ADRS_SIZE ( PROC_REC, VAR_REC, OFST_REC, FRAME_REC, CUR_ADRS,
0000056E  2                    CUR_SIZE, STACK, INDIRECT^, TYPE_VAR, COMPARE_CODE );
000005AC  2    IF ( COMPARE_CODE = NO_ERROR ) AND ( CUR_SIZE > 4 )
000005CE  2      THEN (* Problems:  can't read such a large variable *)
000005CE  2        COMPARE_CODE := CORRUPT_USER;
000005D6  2    IF COMPARE_CODE = NO_ERROR
000005E0  2      THEN (* Variable size is something I can handle *)
000005E0  2        BEGIN (* Read variable out of memory *)
000005E0  2          CASE CUR_SIZE OF
000005E8  2            1:  (* Byte variable *)
000005E8  2              (* Shift value to upper byte *)
000005E8  2              CUR_VALUE := SHIFT ( VALUE_REC.VAL_VALUE, 24 );
00000600  2            2:  (* Word variable *)
00000600  2              (* Shift value to upper word *)
00000600  2              CUR_VALUE := SHIFT ( VALUE_REC.VAL_VALUE, 16 );
00000618  2            3:  (* Word and 1/2 variable *)
00000618  2              (* Shift value up a byte *)
00000618  2              CUR_VALUE := SHIFT ( VALUE_REC.VAL_VALUE, 8 );
0000062A  2            OTHERWISE (* Long word *)
0000062A  2              (* Leave it alone *)
0000062A  2              CUR_VALUE := VALUE_REC.VAL_VALUE
00000634  2          END; (* Of case statement *)
0000065A  2          CUR_DATA := 0; (* Clear data word before filling it up *)
0000065E  2          READ_MEM ( CUR_ADRS, CUR_SIZE, CUR_DATA, EMUL_CODE );
0000067C  2          IF EMUL_CODE = 0
00000684  2            THEN (* Read succeeded *)
00000684  2              CASE VALUE_REC.REL_OP OF
00000692  2                1:  (* Greater than *)
00000692  2                  COMPARE_FLAG := CUR_DATA > CUR_VALUE;
000006A8  2                2:  (* Equal to *)
000006A8  2                  COMPARE_FLAG := CUR_DATA = CUR_VALUE;
000006BE  2                3:  (* Greater than or equal to *)
000006BE  2                  COMPARE_FLAG := CUR_DATA >= CUR_VALUE;
000006D4  2                4:  (* Less than *)
000006D4  2                  COMPARE_FLAG := CUR_DATA < CUR_VALUE;
000006EA  2                5:  (* Not equal to *)
000006EA  2                  COMPARE_FLAG := CUR_DATA <> CUR_VALUE;
00000700  2                6:  (* Less than or equal to *)
00000700  2                  COMPARE_FLAG := CUR_DATA <= CUR_VALUE;
00000716  2                OTHERWISE (* Any of the above:  set true *)
00000716  2                  COMPARE_FLAG := TRUE
0000071E  2              END (* Of case statement *)
0000074E  2            ELSE (* Read failed *)
0000074E  2              COMPARE_CODE := EMUL_PROBLEM
00000756  2        END; (* Read variable out of memory *)
00000756  2    DISPOSE ( INDIRECT ) (* Return indirect record to heap *)
00000768  2  END; (* Procedure COMPARE_VARIABLE *)
00000000  1  $GLOBPROC OFF$
00000000  1  .
508: Warning: field or entry alignment; record or array comparisons may not work

End of compilation, number of errors=    0
```

```
00000000 1 "68000" PREPROCESS
00000000 1 $EXTENSIONS ON$
00000000 1 $TITLE "Soda Dynamic/Static Controller uP Specifics"
00000000 1 PROGRAM MICRO_UTLS;
00000000 1 (*
00000000 1 ****************************** MICRO_UTLS ******************************
00000000 1   MICRO_UTLS is the module containing miscellaneous processor specific
00000000 1   routines necessary for the Dynamic and Static Controllers.  These
00000000 1   routines are responsible for knowing how the emulator and compiler
00000000 1   work for their specific processor, and supplying needed information in
00000000 1   a processor independent manner.  In other words, this module contains
00000000 1   processor dependent code.
00000000 1   Author:  Kip Fulghum
00000000 1   Date:  7-26-83  Revised:  1-10-85
00000000 1 ****************************************************************************
00000000 1
00000000 1   MICRO_UTLS contains the following routines:
00000000 1   -Global procedure P_ADDR returns the physical address equivalent of
00000000 1    the given logical address.
00000000 1   -Global function GET_OFFSET returns the appropriate processor
00000000 1    pre-fetch offset.
00000000 1   -Global function GET_DEPTH returns the appropriate processor queue
00000000 1    depth offset.
00000000 1   -Global procedure GET_VALUE_MASK determines the appropriate value and
00000000 1    mask for tracing different processor status, ie reads, writes, etc.
00000000 1   -Global function GET_BUS_MASK returns the processor specific mask
00000000 1    containing all 1s for all bits on the given bus.
00000000 1   -Function GENERIC_STATUS translates the processor specific status
00000000 1    into a processor independent status.
00000000 1   -Global procedure ADJUST_SEXTET converts a sextet of captured,
00000000 1    processor dependent data into its generic equivalent.
00000000 1   -Global function CLASS_PROC_DATA determines what type of procedural
00000000 1    data was captured.
00000000 1   -Function GET_FSTACK returns the appropriate logical starting stack
00000000 1    value for creating a frame.
00000000 1   -Global function GET_CALL_ADRS determines the address from which the
00000000 1    given procedure was called.
00000000 1   -Global procedure CREATE_FRAME creates a frame record based on the
00000000 1    given procedure and parent information.
00000000 1
00000000 1   In addition, MICRO_UTLS uses the following external routines:
00000000 1   READ_REG, READ_MEM, GET_SEG_REGS, and MASK_BITS.
00000000 1                                                                        *)
00000000 1 (*
00000000 1                     *******************************
00000000 1                     ***** Processor Constants *****
00000000 1                     *******************************
00000000 1                                                                        *)
00000000 1 CONST
00000000 1
00000000 1   PREFETCH_OFST = 2; (* Offset to overcome pre-fetch depth *)
00000000 1
00000000 1   QUEUE_DEPTH   = 2; (* Offset to overcome queue depth, break delay *)
00000000 1
00000000 1 (*
00000000 1               *******************************************
00000000 1               ***** Processor Load Status Constants *****
00000000 1               *******************************************
00000000 1                                                                        *)
00000000 1
00000000 1   R_W_VALUE  = 0DF000000H; (* 68000 status value for data read/write *)
00000000 1
00000000 1   R_W_MASK   = 030000000H; (* 68000 status mask for data read/write *)
00000000 1
00000000 1   R_VALUE    = 0DE000000H; (* 68000 status value for data read *)
00000000 1
00000000 1   R_MASK     = 031000000H; (* 68000 status mask for data read *)
00000000 1
00000000 1   W_VALUE    = 0DF000000H; (* 68000 status value for data write *)
00000000 1
00000000 1   W_MASK     = 031000000H; (* 68000 status mask for data write *)
00000000 1
00000000 1   OP_VALUE   = 06C000000H; (* 68000 status value for opcode read *)
00000000 1
```

```
00000000 1    OP_MASK    = 0B3000000H; (* 68000 status mask for opcode read *)
00000000 1
00000000 1    A_BUS_MASK = 000FFFFFFH; (* 68000 has 24 bit address bus *)
00000000 1
00000000 1    D_BUS_MASK = 00000FFFFH; (* 68000 has 16 bit data bus *)
00000000 1
00000000 1    S_BUS_MASK = 0FF000000H; (* 68000 status is upper byte of address *)
00000000 1
00000000 1  (*
00000000 1                          ***************************
00000000 1                          ***** Include Files *****
00000000 1                          ***************************
00000000 1                                                                      *)
00000000 1
00000000 1  #INCLUDE ER_CONST:SS_DYN
00000000 1
00000000 1  #INCLUDE COM_TYPES:SS_DYN
00000000 1
00000000 1  #INCLUDE UNLD_TYPES:SS_DYN
00000000 1
00000000 1  #INCLUDE ICMD_DATA:SODAMON
00000000 1
00000000 1
00000000 1
00000000 1
00000000 1
00000000 1  $CALL_ABS_LONGS
00000000 1  (*
00000000 1                            *********************
00000000 1                            ***** READ_REG *****
00000000 1                            *********************
00000000 1                                                                      *)
00000000 1  PROCEDURE READ_REG ( REG:  S_INT; VAR REG_VALUE:  L_INT ); EXTERNAL;
00000000 1  (*
00000000 1    Procdedure READ_REG to read the value of the given register ( 0 = PC,
00000000 1    1 = base ptr on entry, 2 = base ptr within ) from the emulator.  Data
00000000 1    is returned MSW, then LSW.  Provided as part of the message handler.
00000000 1                                                                      *)
00000000 1
00000000 1
00000000 1
00000000 1
00000000 1
00000000 1  (*
00000000 1                            *********************
00000000 1                            ***** READ_MEM *****
00000000 1                            *********************
00000000 1                                                                      *)
00000000 1  PROCEDURE READ_MEM ( ADDRESS:  L_INT; COUNT:  S_INT; VAR LOC:  L_INT;
00000000 2                       VAR ERROR:  S_INT ); EXTERNAL;
00000000 1  (*
00000000 1    Procedure READ_MEM to read the specified location(s) in emulation
00000000 1    memory.  The address location is to be logical and given as MSW,
00000000 1    then LSW.  Provided as a part of the message handler.
00000000 1                                                                      *)
00000000 1
00000000 1
00000000 1
00000000 1
00000000 1
00000000 1  (*
00000000 1                          *************************
00000000 1                          ***** GET_SEG_REGS *****
00000000 1                          *************************
00000000 1                                                                      *)
00000000 1  PROCEDURE GET_SEG_REGS ( VAR SEGS:  SEG_ARRAY_TYPE ); EXTERNAL;
00000000 1  (*
00000000 1    Procedure GET_SEG_REGS to read the segment registers of the processor
00000000 1    after a break.  Registers are returned MSW, then LSW.  Provided as
00000000 1    part of the message handler.
00000000 1                                                                      *)
00000000 1
00000000 1
00000000 1
```

```
00000000  1
00000000  1
00000000  1  $CALL_PC_SHORT$
00000000  1  (*
00000000  1                           *********************
00000000  1                           ***** MASK_BITS *****
00000000  1                           *********************
00000000  1                                                                 *)
00000000  1  FUNCTION MASK_BITS ( BIT_WORD, MASK_WORD:  L_INT ):  L_INT; EXTERNAL;
00000000  1  (*
00000000  1    Function MASK_BITS to mask off all zero bits indicated in BIT_WORD
00000000  1    in MASK_WORD, ie "AND" BIT_WORD with MASK_WORD and return the result.
00000000  1    Provided as an assembly language external.
00000000  1                                                                 *)
00000000  1
00000000  1
00000000  1
00000000  1
00000000  1
00000000  1  (*
00000000  1                           ******************
00000000  1                           ***** P_ADDR *****
00000000  1                           ******************
00000000  1                                                                 *)
00000000  1  $GLOBPROC ON$
00000000  1  PROCEDURE P_ADDR ( LOGICAL_ADDR:  L_INT; VAR PHYSICAL_ADDR:  L_INT );
00000004  2  (*
00000004  2    Procedure P_ADDR to return the physical address equivalent of the
00000004  2    given logical address.
00000004  2
00000004  2    Input:  1) LOGICAL_ADDR, the logical address ( really? ), MSW, then
00000004  2               LSW
00000004  2    Output:  1) PHYSICAL_ADDR, the physical address equivalent of the
00000004  2                given logical address, MSW, then LSW
00000004  2                                                                 *)
00000004  2  BEGIN (* Procedure P_ADDR *)
00000004  2    PHYSICAL_ADDR := LOGICAL_ADDR (* 68000 logical adrs = physical adrs *)
0000000C  2  END; (* Procedure P_ADDR *)
00000000  1  $GLOBPROC OFF$
00000000  1
00000000  1
00000000  1
00000000  1
00000000  1
00000000  1  (*
00000000  1                           **********************
00000000  1                           ***** GET_OFFSET *****
00000000  1                           **********************
00000000  1                                                                 *)
00000000  1  $GLOBPROC ON$
00000000  1  FUNCTION GET_OFFSET:  L_INT;
00000014  2  (*
00000014  2    Function GET_OFFSET to return the appropriate processor pre-fetch
00000014  2    offset.
00000014  2
00000014  2    Input:  none
00000014  2    Output:  1) the offset to overcome the pre-fetch depth of the
00000014  2                processor, in function name
00000014  2                                                                 *)
00000014  2  BEGIN (* Function GET_OFFSET *)
00000014  2    GET_OFFSET := PREFETCH_OFST
0000001C  2  END; (* Function GET_OFFSET *)
00000000  1  $GLOBPROC OFF$
00000000  1
00000000  1
00000000  1
00000000  1
00000000  1
00000000  1  (*
00000000  1                           *********************
00000000  1                           ***** GET_DEPTH *****
00000000  1                           *********************
00000000  1                                                                 *)
00000000  1  $GLOBPROC ON$
```

```
00000000 1  FUNCTION GET_DEPTH:  L_INT;
00000028 2  (*
00000028 2    Function GET_DEPTH to return the appropriate processor queue depth
00000028 2    offset.
00000028 2
00000028 2    Input:  none
00000028 2    Output:  1) the offset to overcome the queue depth of the processor,
00000028 2               in function name
00000028 2                                                                   *)
00000028 2  BEGIN (* Function GET_DEPTH *)
00000028 2    GET_DEPTH := QUEUE_DEPTH
00000030 2  END; (* Function GET_DEPTH *)
00000000 1  $GLOBPROC OFF$
00000000 1
00000000 1
00000000 1
00000000 1
00000000 1
00000000 1  (*
00000000 1                           ***************************
00000000 1                           ***** GET_VALUE_MASK *****
00000000 1                           ***************************
00000000 1                                                                   *)
00000000 1  $GLOBPROC ON$
00000000 1  PROCEDURE GET_VALUE_MASK ( ACCESS:  S_INT; VAR VALUE, MASK:  L_INT );
0000003C 2  (*
0000003C 2    Procedure GET_VALUE_MASK to determine the appropriate value and
0000003C 2    mask for tracing different processor status, ie reads, writes, etc.
0000003C 2    Procedure simply cases off access, then returns the appropriate
0000003C 2    value and mask.
0000003C 2
0000003C 2    Input:  1) ACCESS, a word describing what type of access is desired:
0000003C 2               1 = read, 2 = write, 3 = read/write, 4 = opcode fetch
0000003C 2    Output:  1) VALUE, the appropriate value for the type of access
0000003C 2                requested
0000003C 2             2) MASK, the appropriate mask for the type of access
0000003C 2                requested
0000003C 2                                                                   *)
0000003C 2  BEGIN (* Procedure GET_VALUE_MASK *)
0000003C 2    CASE ACCESS OF
00000046 2      READ:  (* Tracing reads *)
00000046 2        BEGIN (* Set up value/mask for reads *)
00000046 2          VALUE := R_VALUE;
00000050 2          MASK := R_MASK
0000005A 2        END; (* Set up value/mask for reads *)
0000005E 2      WRITE:  (* Tracing writes *)
0000005E 2        BEGIN (* Set up value/mask for writes *)
0000005E 2          VALUE := W_VALUE;
00000068 2          MASK := W_MASK
00000072 2        END; (* Set up value/mask for writes *)
00000076 2      READ_WRITE:  (* Tracing reads/writes *)
00000076 2        BEGIN (* Set up value/mask for reads/writes *)
00000076 2          VALUE := R_W_VALUE;
00000080 2          MASK := R_W_MASK
0000008A 2        END; (* Set up value/mask for reads/writes *)
0000008E 2      OTHERWISE (* Tracing opcodes *)
0000008E 2        BEGIN (* Set up value/mask for opcodes *)
0000008E 2          VALUE := OP_VALUE;
00000098 2          MASK := OP_MASK
000000A2 2        END (* Set up value/mask for opcodes *)
000000A2 2    END (* Of case statement *)
000000C8 2  END; (* Procedure GET_VALUE_MASK *)
00000000 1  $GLOBPROC OFF$
00000000 1
00000000 1
00000000 1
00000000 1
00000000 1
00000000 1  (*
00000000 1                           **************************
00000000 1                           ***** GET_BUS_MASK *****
00000000 1                           **************************
00000000 1                                                                   *)
00000000 1  $GLOBPROC ON$
```

```
00000000  1  FUNCTION GET_BUS_MASK ( BUS:  S_INT ):  L_INT;
000000D0  2  (*
000000D0  2    Function GET_BUS_MASK to return the processor specific mask containing
000000D0  2    all 1s for all bits on the given bus.
000000D0  2
000000D0  2    Input:  1) BUS, the bus for which a mask is needed:
000000D0  2               0 = address bus, 1 = data bus, 2 = status bus
000000D0  2    Output:  1) a mask with all bits associated with the given bus set,
000000D0  2                in function name
000000D0  2                                                                        *)
000000D0  2  BEGIN (* Function GET_BUS_MASK *)
000000D0  2    CASE BUS OF
000000DA  2      0:  (* Address bus *)
000000DA  2        GET_BUS_MASK := A_BUS_MASK;
000000E6  2      1:  (* Data bus *)
000000E6  2        GET_BUS_MASK := D_BUS_MASK;
000000F2  2      OTHERWISE (* Assume status bus *)
000000F2  2        GET_BUS_MASK := S_BUS_MASK
000000FA  2    END (* Of case statement *)
0000011C  2  END; (* Function GET_BUS_MASK *)
00000000  1  $GLOBPROC OFF$
00000000  1
00000000  1
00000000  1
00000000  1
00000000  1
00000000  1  (*
00000000  1                          ***************************
00000000  1                          ***** GENERIC_STATUS *****
00000000  1                          ***************************
00000000  1                                                                        *)
00000000  1  FUNCTION GENERIC_STATUS ( PRCSSR_ADRS:  L_INT; PRCSSR_STATUS:  S_INT ):
00000000  2                          S_INT;
00000128  2  (*
00000128  2    Function GENERIC_STATUS to translate the processor specific status
00000128  2    into a processor independent status.
00000128  2
00000128  2    Input:  1) PRCSSR_ADRS, the processor specific address from the
00000128  2               emulation address bus
00000128  2            2) PRCSSR_STATUS, the processor specific status from the
00000128  2               emulation status bus
00000128  2    Output:  1) generic, processor independent status, in function name
00000128  2                                                                        *)
00000128  2  BEGIN (* Function GENERIC_STATUS *)
00000128  2    GENERIC_STATUS := PRCSSR_STATUS (* 68000 status is generic status *)
0000012E  2  END; (* Function GENERIC_STATUS *)
00000000  1
00000000  1
00000000  1
00000000  1
00000000  1
00000000  1  (*
00000000  1                          ***************************
00000000  1                          ***** ADJUST_SEXTET *****
00000000  1                          ***************************
00000000  1                                                                        *)
00000000  1  $GLOBPROC ON$
00000000  1  PROCEDURE ADJUST_SEXTET ( VAR SEXTET:  SEXTET_REC_TYPE );
00000000  2  (*
00000000  2    Procedure ADJUST_SEXTET to convert a sextet of captured, processor
00000000  2    dependent data into its generic equivalent.  Procedure converts
00000000  2    processor status to generic status, and any masking of data and/or
00000000  2    address bits to come up with a generic data sextet.
00000000  2
00000000  2    ADJUST_SEXTET uses the following routines:  GENERIC_STATUS,
00000000  2    GET_BUS_MASK, and MASK_BITS.
00000000  2
00000000  2    Input:  1) SEXTET, the captured emulation data sextet to be converted
00000000  2    Output:  1) SEXTET, the modified input sextet, now a generic
00000000  2                equivalent of the input emulation sextet
00000000  2                                                                        *)
00000000  2  VAR
00000000  2
00000000  2    ADDR_MASK:  L_INT; (* Processor mask for address bus *)
0000013C  2
```

```
0000013C  2  BEGIN (* Procedure ADJUST_SEXTET *)
0000013C  2    (* Nothing needs to be done for the 68000, so all this code is
0000013C  2       commented out.  It's here to show what might need to be done for
0000013C  2       other processors *)
0000013C  2  {
0000013C  2    (* Convert processor status to generic status:  must be done BEFORE
0000013C  2       doing anything to the address! *)
0000013C  2    SEXTET.STATUS := GENERIC_STATUS ( SEXTET.ADRS, SEXTET.STATUS );
0000013C  2    (* Mask off all non-address bits for this processor *)
0000013C  2    ADDR_MASK := GET_BUS_MASK ( 0 );
0000013C  2    SEXTET_REC.ADRS := MASK_BITS ( ADDR_MASK, SEXTET.ADRS );
0000013C  2    SEXTET_REC.PC := MASK_BITS ( ADDR_MASK, SEXTET.PC )
0000013C  2  }
0000013C  2  END; (* Procedure ADJUST_SEXTET *)
00000000  1  $GLOBPROC OFF$
00000000  1
00000000  1
00000000  1
00000000  1
00000000  1
00000000  1  (*
00000000  1                          ****************************
00000000  1                          ***** CLASS_PROC_DATA *****
00000000  1                          ****************************
00000000  1                                                                   *)
00000000  1  $GLOBPROC ON$
00000000  1  FUNCTION CLASS_PROC_DATA ( VAR PROC_REC:  CMD_DATA_TYPE; ADRS, PREV_PC,
00000000  2                            NEXT_PC:  L_INT ):  S_INT;
00000002  2  (*
00000002  2    Function CLASS_PROC_DATA to determine what type of procedural data
00000002  2    was captured.  Checks are made for entry into the procedure, exit
00000002  2    from the procedure, along with other various "zones" and "points"
00000002  2    of interest.  The zones/points supported for each processor vary,
00000002  2    and some zones/points may not exist for some processors.  Here is a
00000002  2    general description of all zones/points:
00000002  2
00000002  2      Value     Zone    Point    Description
00000002  2      -----     ----    -----    -----------
00000002  2         4        | - - -  A     Entry to proc, ie first instruction
00000002  2      -10       A--
00000002  2        -6        | - - - "B"    Stack ready ( not supported )
00000002  2      -11       B--
00000002  2        -4        | - - -  C     Entry+offset:  value params/static
00000002  2                  |              links moved
00000002  2      -12       C-- <- - - - - - - Body of procedure is in zone C
00000002  2                  |
00000002  2        -5        | - - -  D     Exit-offset:  stack unbuilt
00000002  2      -13       D--
00000002  2         5        | - - -  E     Exit from proc, ie last instruction
00000002  2
00000002  2    Ask a neighbor about the zoning laws in your area.
00000002  2
00000002  2    CLASS_PROC_DATA uses the following routine:  P_ADDR.
00000002  2
00000002  2    Note 1:  CLASS_PROC_DATA is used by real-time routines.  Therefore,
00000002  2             it cannot use any routines that expect to be in the
00000002  2             emulation monitor when called!
00000002  2    Note 2:  the order in which the tests are done is critical because
00000002  2             of overlapping points and zones.  The tests are done in
00000002  2             order of decreasing importance and to improve performance.
00000002  2
00000002  2    Input:  1) PROC_REC, the procedure record from the user structure
00000002  2               related to the captured ADRS
00000002  2            2) ADRS, the physical address which is to be classified
00000002  2            3) PREV_PC, the physical program counter associated with ADRS, or
00000002  2               or -1 if there is not one
00000002  2            4) NEXT_PC, the next physical program counter to be executed,
00000002  2               or -1 if there is not one
00000002  2    Output:  1) the type of procedure data ADRS is, in function name:
00000002  2                -13 indicates in "D" zone, ie from stack unbuilt to exit
00000002  2                -12 indicates in "C" zone, ie from stack built to unbuilt
00000002  2                -11 indicates in "B" zone, ie from stack ready to built
00000002  2                -10 indicates in "A" zone, ie from entry to stack ready
00000002  2                    ( doesn't exist for the 68000 )
```

```
00000002  2               -5 indicates procedure exit-exit offset
00000002  2               -4 indicates procedure entry+entry offset
00000002  2               -1 indicates data does not relate to symbol
00000002  2                4 indicates procedure entry
00000002  2                5 indicates procedure exit
00000002  2                                                                      *)
00000002  2  VAR
00000002  2
00000002  2    PENTRY:  L_INT; (* Physical entry address *)
00000006  2
00000006  2    PEXIT:  L_INT; (* Physical exit address *)
0000000A  2
0000000A  2    PFAKE_ENTRY:  L_INT; (* Physical entry+offset *)
0000000E  2
0000000E  2    PFAKE_EXIT:  L_INT; (* Physical exit-offset *)
00000012  2
00000012  2    CLASS:  S_INT; (* Type of procedural data *)
00000144  2
00000144  2  BEGIN (* Function CLASS_PROC_DATA *)
00000144  2
00000144  2    (* Convert everything to physical *)
00000144  2    P_ADDR ( PROC_REC.ENTRY, PENTRY );
00000156  2    P_ADDR ( PROC_REC.EXIT, PEXIT );
00000168  2    PFAKE_ENTRY := PENTRY + PROC_REC.ENTRY_OFFSET;
0000017A  2    PFAKE_EXIT := PEXIT - PROC_REC.EXIT_OFFSET;
0000018A  2
0000018A  2    CLASS := GARBAGE; (* Assume data does not even belong *)
00000190  2
00000190  2    (* Entry test:  should be first for speed considerations *)
00000190  2
00000190  2    IF ( ( ADRS = PENTRY ) AND ( ( PREV_PC = -1 ) OR
00000190  2       ( PREV_PC+2 <> PENTRY ) ) AND ( ( NEXT_PC = -1 ) OR
00000190  2       ( NEXT_PC <> PENTRY ) ) ) OR ( ADRS = PENTRY+2 )
000001F4  2      THEN (* We found an entry point:  for the 68000, the 2nd of "twin"
000001F4  2              breaks is the only one which counts!  The 1st will be
000001F4  2              classified as garbage *)
000001F4  2        CLASS := PROC_ENTRY
000001FE  2      ELSE (* Nothing yet *)
000001FE  2
000001FE  2    (* Exit test:  should be second for speed considerations *)
000001FE  2
000001FE  2    IF ( ADRS = PEXIT ) AND ( ( PREV_PC = -1 ) OR
000001FE  2       ( PREV_PC = PEXIT-2 ) )
00000232  2      THEN (* We found an exit point:  for the 68000, the 1st of "twin"
00000232  2              breaks is the only one which counts!  The 2nd will be
00000232  2              classified as garbage.  WARNING:  this test FAILS if an
00000232  2              interrupt occurs between the UNLK and the RTS!!!  Nothing
00000232  2              can be done about it! *)
00000232  2        CLASS := PROC_EXIT
0000023C  2      ELSE (* Nothing yet *)
0000023C  2
0000023C  2    (* Entry+offset test *)
0000023C  2
0000023C  2    IF ( ADRS = PFAKE_ENTRY ) AND ( ( PREV_PC = -1 ) OR
0000023C  2       ( PREV_PC < PFAKE_ENTRY ) OR ( PREV_PC > PEXIT ) ) AND
0000023C  2       ( ( NEXT_PC = -1 ) OR ( ( NEXT_PC > PFAKE_ENTRY ) AND
0000023C  2       ( NEXT_PC <= PFAKE_EXIT ) ) )
000002A2  2      THEN (* We found a pseudo entry point:  for the 68000, the 2nd of
000002A2  2              "twin" breaks is the only one which counts!  The 1st will
000002A2  2              be classified as garbage.  WARNING:  this test FAILS if an
000002A2  2              interrupt occurs immediately after the pseudo entry!!!
000002A2  2              Nothing can be done about it! *)
000002A2  2        CLASS := PSEUDO_ENTRY
000002AC  2      ELSE (* Nothing yet *)
000002AC  2
000002AC  2    (* Exit-offset test *)
000002AC  2
000002AC  2    IF ( ADRS = PFAKE_EXIT ) AND ( ( NEXT_PC = -1 ) OR
000002AC  2       ( NEXT_PC > PFAKE_EXIT ) AND ( NEXT_PC <= PEXIT ) )
000002E8  2      THEN (* We found a pseudo exit point:  for the 68000, the 2nd of
000002E8  2              "twin" breaks is the only one which counts!  The 1st will
000002E8  2              be classified as garbage.  WARNING:  this test FAILS if an
000002E8  2              interrupt occurs immediately after the pseudo exit!!!
000002E8  2              Nothing can be done about it! *)
```

```
000002E8  2         CLASS := PSEUDO_EXIT
000002F2  2       ELSE (* Nothing yet *)
000002F2  2
000002F2  2    (* A zone test doesn't apply to the 68000 *)
000002F2  2
000002F2  2    (* B zone test *)
000002F2  2
000002F2  2    IF ( ADRS >= PENTRY+4 ) AND ( ADRS < PFAKE_ENTRY )
00000314  2      THEN (* We found something in the "B" zone *)
00000314  2        CLASS := B_ZONE
0000031E  2      ELSE (* Nothing yet *)
0000031E  2
0000031E  2    (* C zone test *)
0000031E  2
0000031E  2    IF ( ADRS > PFAKE_ENTRY ) AND ( ADRS < PFAKE_EXIT )
0000033C  2      THEN (* We found something in the "C" zone *)
0000033C  2        CLASS := C_ZONE;
00000342  2
00000342  2    (* D zone test doesn't apply to the 68000 *)
00000342  2
00000342  2    (* Assign final function value *)
00000342  2    CLASS_PROC_DATA := CLASS
00000348  2  END; (* Function CLASS_PROC_DATA *)
00000000  1  $GLOBPROC OFF$
00000000  1
00000000  1
00000000  1
00000000  1
00000000  1
00000000  1  (*
00000000  1                               ************************
00000000  1                               ***** GET_FSTACK *****
00000000  1                               ************************
00000000  1                                                                          *)
00000000  1  FUNCTION GET_FSTACK ( VAR PROC_REC:  CMD_DATA_TYPE ):  L_INT;
00000004  2  (*
00000004  2    Function GET_FSTACK to return the appropriate logical starting stack
00000004  2    value for creating a frame.  Function tries to determine a stack
00000004  2    address that is valid for creating a frame based on the next PC.
00000004  2    GET_FSTACK assumes that the emulator is running in the monitor.
00000004  2
00000004  2    GET_FSTACK uses the following routines:  READ_REG, P_ADDR,
00000004  2    and CLASS_PROC_DATA.
00000004  2
00000004  2    Input:  1) PROC_REC, the record describing the procedure for which a
00000004  2               frame is to be created
00000004  2    Output:  1) the appropriate logical stack address to use for creating
00000004  2                a frame at the current location, or -1 indicating no
00000004  2                frame can be built there, in function name
00000004  2                                                                          *)
00000004  2  VAR
00000004  2
00000004  2    STACK:  L_INT; (* Correct frame stack *)
00000008  2
00000008  2    NEXT_PC:  L_INT; (* Guess *)
0000000C  2
0000000C  2    LOC:  S_INT; (* Location in the procedure *)
00000356  2
00000356  2  BEGIN (* Function GET_FSTACK *)
00000356  2    (* Find out where we are *)
00000356  2    READ_REG ( 0, NEXT_PC );
00000364  2    P_ADDR ( NEXT_PC, NEXT_PC );
00000372  2    LOC := CLASS_PROC_DATA ( PROC_REC, NEXT_PC, -1 ,-1 );
00000396  2    IF ( LOC = PSEUDO_ENTRY ) OR ( LOC = B_ZONE ) OR ( LOC = C_ZONE ) OR
00000396  2       ( LOC = PSEUDO_EXIT )
000003CC  2      THEN (* In an area I understand *)
000003CC  2        READ_REG ( 1, STACK )  (* Base ptr on entry works for all zones
000003E0  2                                  the 68000 supports:  see READ_REG *)
000003E0  2      ELSE (* Somewhere in an epsilon zone *)
000003E0  2        STACK := -1;
000003E8  2    GET_FSTACK := STACK (* Assign final function value *)
000003EE  2  END; (* Function GET_FSTACK *)
00000000  1
00000000  1
```

```
00000000  1
00000000  1
00000000  1
00000000  1  (*
00000000  1                       ***********************
00000000  1                       ***** GET_CALL_ADRS *****
00000000  1                       ***********************
00000000  1                                                                    *)
00000000  1  $GLOBPROC ON$
00000000  1  FUNCTION GET_CALL_ADRS ( VAR PROC_REC:  CMD_DATA_TYPE ):  L_INT;
00000004  2  (*
00000004  2    Function GET_CALL_ADRS to determine the address from which the given
00000004  2    procedure was called.  Procedure first gets a stack pointer for
00000004  2    creating frames, then offsets from there to read the return address.
00000004  2    An appropriate value is then subtracted from this to obtain the
00000004  2    calling address.  If no stack pointer is valid or there is an error,
00000004  2    an indication is returned.  GET_CALL_ADRS assumes that the processor
00000004  2    is running in the monitor.
00000004  2
00000004  2    GET_CALL_ADRS uses the following routines:  GET_FSTACK and READ_MEM.
00000004  2
00000004  2    Input:  1) PROC_REC, a record describing the procedure for which the
00000004  2               call address is to be determined
00000004  2    Output:  1), the logical address from which the procedure was called,
00000004  2                or -1 if it cannot be determined, in function name
00000004  2                                                                    *)
00000004  2  VAR
00000004  2
00000004  2    CALL_ADRS:  L_INT; (* Call address *)
00000008  2
00000008  2    EMUL_CODE:  S_INT; (* Return code from emulation *)
000003FA  2
000003FA  2  BEGIN (* Function GET_CALL_ADRS *)
000003FA  2    CALL_ADRS := GET_FSTACK ( PROC_REC ); (* Get stack ptr for frame *)
0000040A  2    IF CALL_ADRS <> -1
00000418  2      THEN (* We have a stack address for creating a frame *)
00000418  2        BEGIN (* Get call address *)
00000418  2          READ_MEM ( CALL_ADRS+4, 4, CALL_ADRS, EMUL_CODE );
00000434  2          IF EMUL_CODE = 0
0000043C  2            THEN (* We have return address *)
0000043C  2              CALL_ADRS := CALL_ADRS - 2
00000444  2            ELSE (* Emulation error *)
00000444  2              CALL_ADRS := -1
0000044C  2        END; (* Get call address *)
0000044C  2    GET_CALL_ADRS := CALL_ADRS (* Assign final function value *)
00000452  2  END; (* Function GET_CALL_ADRS *)
00000000  1  $GLOBPROC OFF$
00000000  1
00000000  1
00000000  1
00000000  1
00000000  1
00000000  1  (*
00000000  1                       ************************
00000000  1                       ***** CREATE_FRAME *****
00000000  1                       ************************
00000000  1                                                                    *)
00000000  1  $GLOBPROC ON$
00000000  1  PROCEDURE CREATE_FRAME ( VAR PROC_REC, PARENT_REC:  CMD_DATA_TYPE;
00000000  2                           VAR FRAME_INFO:  FRAME_REC_TYPE; VAR
00000000  2                           CRT_CODE:  S_INT );
00000000  2  (*
00000000  2    Procedure CREATE_FRAME to create a frame record based on the given
00000000  2    procedure and parent information.  Procedure first gets all the
00000000  2    segment registers, then the appropriate logical stack.  After that,
00000000  2    CREATE_FRAME finds the first static link, then follows the linked
00000000  2    list down, subtacting offsets to create the stack address for each
00000000  2    parent procedure.  All these addresses are stored in the frame
00000000  2    record and returned to the caller.  CREATE_FRAME assumes that the
00000000  2    emulator is running in the monitor.
00000000  2
00000000  2    Note:  if CREATE_FRAME is called for a main program, it will put
00000000  2           the stack address and a 0 subroutine # in the frame and
00000000  2           return to the caller.
```

```
00000000  2
00000000  2    CREATE_FRAME uses the following routines:  GET_FSTACK, READ_MEM,
00000000  2    and GET_SEG_REGS.
00000000  2
00000000  2    Input:  1) PROC_REC, the record describing the procedure for which a
00000000  2               frame is to be created
00000000  2            2) PARENT_REC, the record describing the parent procedures
00000000  2    Output:  1) FRAME_INFO, the completed frame record with valid segment
00000000  2                and logical stack addresses
00000000  2             2) CRT_CODE, a return code indicating how the build turned
00000000  2                out:
00000000  2                 -26 indicates emulation error
00000000  2                 -16 indicates frame cannot be created at current
00000000  2                       location
00000000  2                   0 indicates no error:  frame record completed
00000000  2                                                                      *)
00000000  2
00000000  2  VAR
00000000  2
00000000  2    EMUL_CODE:  S_INT; (* Return code from emulation *)
00000002  2
00000002  2    CUR_PTR:  L_INT; (* Pointer to current static link *)
00000006  2
00000006  2    I:  S_INT; (* WHILE loop counter *)
0000045E  2
0000045E  2  BEGIN (* Procedure CREATE_FRAME *)
0000045E  2    CRT_CODE := NO_ERROR;
00000464  2    (* Get all the segment register values *)
00000464  2    GET_SEG_REGS ( FRAME_INFO.SEGMENTS );
00000472  2    (* Get this procedure's subroutine number and stack address *)
00000472  2    WITH FRAME_INFO.FRAME [ 0 ] DO
0000047E  2      BEGIN (* Set up procedure information *)
0000047E  2        SUBNO := PARENT_REC.PROC_NUMS [ 0 ];
00000488  2        STACK_ADRS := GET_FSTACK ( PROC_REC );
000004A6  2        IF STACK_ADRS = -1
000004B8  2          THEN (* Can't create a frame *)
000004B8  2            CRT_CODE := CANT_MAKE_FRAME
000004C0  2      END; (* Set up procedure information *)
000004C0  2    IF ( FRAME_INFO.FRAME [ 0 ].SUBNO <> 0 ) AND ( CRT_CODE = NO_ERROR )
000004E2  2      THEN (* This is not a main program *)
000004E2  2        BEGIN (* Follow the static links *)
000004E2  2          (* Get first static link:  garbage if no parents *)
000004E2  2          CUR_PTR := PARENT_REC.STACK_OFFS [ 0 ] + FRAME_INFO.FRAME [ 0 ].
000004E2  2                       STACK_ADRS;
000004FA  2          I := 1;
00000500  2          WHILE ( PARENT_REC.PROC_NUMS [ I ] <> 0 ) AND
00000500  2                ( CRT_CODE = NO_ERROR ) DO
0000052A  2            BEGIN (* Create entry in frame record array *)
0000052A  2              (* Read link out of emulation memory *)
0000052A  2              READ_MEM ( CUR_PTR, 4, CUR_PTR, EMUL_CODE );
00000546  2              IF EMUL_CODE = 0
0000054E  2                THEN (* Read went alright *)
0000054E  2                  WITH FRAME_INFO.FRAME [ I ] DO
00000566  2                    BEGIN (* Fill in entry in frame record array *)
00000566  2                      SUBNO := PARENT_REC.PROC_NUMS [ I ];
00000578  2                      STACK_ADRS := CUR_PTR - PARENT_REC.STACK_OFFS [ I ];
0000059A  2                      I := I + 1
0000059E  2                    END (* Fill in entry in frame.record array *)
000005A2  2                ELSE (* Emulation problems *)
000005A2  2                  CRT_CODE := EMUL_PROBLEM
000005AA  2            END; (* Create entry in frame record array *)
000005AE  2          FRAME_INFO.FRAME [ I ].SUBNO := 0 (* Mark end of frame *)
000005C2  2        END (* Follow the static links *)
000005C2  2  END; (* Procedure CREATE_FRAME *)
00000000  1  $GLOBPROC OFF$
00000000  1  .

508: Warning: field or entry alignment; record or array comparisons may not work

End of compilation, number of errors=     0
00000000  1  "68000" PREPROCESS
00000000  1
00000000  1  (*******************************)
00000000  1  (* Filename:  IMA_UTLS:SS_68K *)
```

```
00000000  1  (* Author:     Dan Schmelzer    *)
00000000  1  (* Initial Date:  6/12/84       *)
00000000  1  (* Revised Date:  8/17/84       *)
00000000  1  (********************************)
00000000  1
00000000  1  (*************************************************************************)
00000000  1  (* 68000 MICROPROCESSOR SPECIFIC CODE FOR THE TRACE MODULES ALL          *)
00000000  1  (* MEASUREMENT.                                                          *)
00000000  1  (*************************************************************************)
00000000  1
00000000  1
00000000  1  (*************************************************************************)
00000000  1  (* Procedures and/or Functions contained in this file:                   *)
00000000  1  (*                                                                       *)
00000000  1  (*    Name                    What it does                               *)
00000000  1  (* ---------------    ---------------------------------------------------*)
00000000  1  (* GET_TMA_HOOKS      Global procedure which gets the processor          *)
00000000  1  (*                    specific procedure entry and exit hooks            *)
00000000  1  (*                    (data patterns) for Trace Modules All.             *)
00000000  1  (*                                                                       *)
00000000  1  (* TMA_FILTER         Global procedure which determines if the sextet    *)
00000000  1  (*                    passed it is valid information.  This procedure    *)
00000000  1  (*                    is processor specific.                             *)
00000000  1  (*                                                                       *)
00000000  1  (*************************************************************************)
00000000  1  (* External procedures called from this file:  None.                     *)
00000000  1  (*                                                                       *)
00000000  1  (* External functions called from this file:  None.                      *)
00000000  1  (*                                                                       *)
00000000  1  (*************************************************************************)
00000000  1  (* Expansion of data types used in this file:                            *)
00000000  1  (*                                                                       *)
00000000  1  (*                      TMA_HOOKS                                        *)
00000000  1  (*                       .HOOK_QTY                                       *)
00000000  1  (*                       .HOOK [0..n]                                    *)
00000000  1  (*                         .VAL                                          *)
00000000  1  (*                         .MSK                                          *)
00000000  1  (*                         .KIND                                         *)
00000000  1  (*                                                                       *)
00000000  1  (*                      SEXTET_REC                                       *)
00000000  1  (*                       .PC                                             *)
00000000  1  (*                       .ADRS                                           *)
00000000  1  (*                       .COUNT                                          *)
00000000  1  (*                       .DATA                                           *)
00000000  1  (*                       .STATUS                                         *)
00000000  1  (*                       .FLAGS                                          *)
00000000  1  (*                                                                       *)
00000000  1  (*-***********************************************************************)
00000000  1
00000000  1
00000000  1  $LIST_CODE OFF$
00000000  1  $EXTENSIONS ON$
00000000  1  $TITLE "Soda Trace Modules All, Processor Specific - 68000"
00000000  1  PROGRAM TMA_UTLS;
00000000  1
00000000  1
00000000  1  (*****************)
00000000  1  (* INCLUDE FILES *)
00000000  1  (*****************)
00000000  1
00000000  1  #INCLUDE COM_TYPES:SS_DYN
00000000  1  #INCLUDE UMLD_TYPES:SS_DYN
00000000  1  #INCLUDE TMA_TYPES:SS_DYN
00000000  1
00000000  1
00000000  1  (************************************)
00000000  1  (* SHARED CONSTANTS FOR THIS FILE *)
00000000  1  (************************************)
00000000  1
00000000  1  CONST                             (* 68000 specific constants.          *)
00000000  1    NUM_HOOKS = 3;                  (* Number of entry/exit hooks.        *)
00000000  1
00000000  1    ENTRY_1_VAL = 04E56H;           (* LINK A6 instruction.  Entry hook.  *)
00000000  1    ENTRY_1_MSK = 0FFFFH;
00000000  1
```

```
00000000  1    EXIT_1_VAL = 04E75H;          (* RTS instructrion.  Exit hook.      *)
00000000  1    EXIT_1_MSK = 0FFFFH;
00000000  1    EXIT_2_VAL = 04E73H;          (* RTE instructrion.  Exit hook.      *)
00000000  1    EXIT_2_MSK = 0FFFFH;
00000000  1
00000000  1
00000000  1  $GLOBPROC ON$
00000000  1
00000000  1  (*+ 68000 SPECIFIC *******************************************************)
00000000  1  (**************************** GET_TMA_HOOKS ****************************)
00000000  1  (**************************************************************************)
00000000  1  (* VAR Parameters:                                                        *)
00000000  1  (*   TMA_HOOKS  Output - Structure containing the entry and exit          *)
00000000  1  (*                  hooks (data patterns).                                *)
00000000  1  (*                                                                        *)
00000000  1  (* Value Parameters: None                                                 *)
00000000  1  (*                                                                        *)
00000000  1  (**************************************************************************)
00000000  1  (* Procedures called by GET_TMA_HOOKS: None                               *)
00000000  1  (*                                                                        *)
00000000  1  (* Functions called by GET_TMA_HOOKS: None                                *)
00000000  1  (*                                                                        *)
00000000  1  (**************************************************************************)
00000000  1  (* Procedure GET_TMA_HOOKS assigns the processor specific, procedure      *)
00000000  1  (* entry and exit hook constants to record TMA_HOOKS.                     *)
00000000  1  (*-************************************************************************)
00000000  1
00000000  1  PROCEDURE GET_TMA_HOOKS (VAR TMA_HOOKS: HOOK_REC_TYPE);
00000004  2
00000004  2  BEGIN
00000004  2    WITH TMA_HOOKS DO
0000000C  2      BEGIN      (* Assign hook constants to hook record.              *)
0000000C  2        HOOK_QTY := NUM_HOOKS;
00000010  2
00000010  2        HOOK[0].VAL := ENTRY_1_VAL;
0000001C  2        HOOK[0].MSK := ENTRY_1_MSK;
0000002A  2        HOOK[0].KIND := PROC_ENTRY;
00000038  2
00000038  2        HOOK[1].VAL := EXIT_1_VAL;
00000046  2        HOOK[1].MSK := EXIT_1_MSK;
00000058  2        HOOK[1].KIND := PROC_EXIT;
0000006A  2
0000006A  2        HOOK[2].VAL := EXIT_2_VAL;
00000078  2        HOOK[2].MSK := EXIT_2_MSK;
0000008A  2        HOOK[2].KIND := PROC_EXIT
0000009C  2      END
0000009C  2  END;                           (* End of procedure GET_TMA_HOOKS.    *)
00000000  1
00000000  1
00000000  1  (*+ 68000 SPECIFIC *******************************************************)
00000000  1  (****************************** TMA_FILTER *******************************)
00000000  1  (**************************************************************************)
00000000  1  (* VAR Parameters:                                                        *)
00000000  1  (*   SEXTET_REC     Input - Structure containing the sextet of            *)
00000000  1  (*                    captured data pulled from the hardware.             *)
00000000  1  (*                  Output - Structure containing the possibly            *)
00000000  1  (*                    modified sextet of captured data.  (For the         *)
00000000  1  (*                    68000 the sextet is never modified.)                *)
00000000  1  (*                                                                        *)
00000000  1  (*   PASSED_FLAG    Output - Boolean flag indicating whether or not       *)
00000000  1  (*                    the sextet passed the processor specific            *)
00000000  1  (*                    filter.                                             *)
00000000  1  (*                                                                        *)
00000000  1  (* Value Parameters:                                                      *)
00000000  1  (*   KIND_OF_HOOK   Input - What kind of hook this sextet is              *)
00000000  1  (*                    (PROC_ENTRY or PROC_EXIT).                          *)
00000000  1  (*                                                                        *)
00000000  1  (*   OFFSET         Input - Offset of the captured address in the         *)
00000000  1  (*                    sextet with respect to the actual entry/exit        *)
00000000  1  (*                    address pulled out of the database.                 *)
00000000  1  (*                                                                        *)
00000000  1  (**************************************************************************)
00000000  1  (* Procedures called by TMA_FILTER: None                                  *)
00000000  1  (*                                                                        *)
```

```
00000000 1 (* Functions called by TMA_FILTER: None                               *)
00000000 1 (*                                                                    *)
00000000 1 (*********************************************************************)
00000000 1 (* Procedure TMA_FILTER determines if the sextet passed it is valid  *)
00000000 1 (* information.                                                       *)
00000000 1 (* The captured address of the entry or exit hook must match exactly  *)
00000000 1 (* the actual entry or exit pulled out of the database; that is, the  *)
00000000 1 (* offset passed in must be zero.  Also, the entry point must not be  *)
00000000 1 (* prefetched.  This is checked by comparing the captured PC value    *)
00000000 1 (* against the captured address value.  If the PC value is exactly    *)
00000000 1 (* two smaller than the address value, the sextet has been prefetched *)
00000000 1 (* and it fails the filter.                                           *)
00000000 1 (*-*******************************************************************)
00000000 1
00000000 1 PROCEDURE TMA_FILTER (VAR SEXTET_REC: SEXTET_REC_TYPE;
00000000 2                      KIND_OF_HOOK: S_INT; OFFSET: L_INT;
00000000 2                      VAR PASSED_FLAG: BOOLEAN);
000000A4 2 BEGIN
000000A4 2
000000A4 2   PASSED_FLAG := FALSE;          (* Assume the worst.             *)
000000AA 2
000000AA 2   CASE KIND_OF_HOOK OF           (* Determine the kind of hook.   *)
000000B4 2
000000B4 2     PROC_ENTRY:                  (* Handle an entry hook.         *)
000000B4 2       IF (OFFSET = 0) AND ((SEXTET_REC.PC + 2) <> SEXTET_REC.ADRS)
000000DA 2             (* Must have an exact entry point address match and  *)
000000DA 2             (* must not be prefetched (where captured PC is 2    *)
000000DA 2       THEN  (* less than the captured address) to pass the filter.*)
000000DA 2         PASSED_FLAG := TRUE;
000000E6 2
000000E6 2     PROC_EXIT:                   (* Handle an exit hook.          *)
000000E6 2       IF OFFSET = 0              (* Must have an exact exit point *)
000000EE 2       THEN                       (* address match to pass the filter. *)
000000EE 2         PASSED_FLAG := TRUE;
000000FA 2
000000FA 2     OTHERWISE                    (* Got passed garbage so bail out. *)
000000FA 2   END
0000011E 2 END;                             (* End of procedure TMA_FILTER.  *)
00000000 1
00000000 1
00000000 1 $GLOBPROC OFFS
00000000 1 .                                (* End of program TMA_UTLS.      *)
00000000 1
00000000 1
00000000 1 (************************** End of document *****************************)

508: Warning: field or entry alignment; record or array comparisons may not work

End of compilation, number of errors=    0

(**********************************)
(* Filename:  TMA_TYPES:SS_DYM *)
(* Author:     Dan Schmelzer    *)
(* Initial Date:  6/12/84       *)
(* Revised Date:  8/17/84       *)
(**********************************)

(**********************************************************************)
(* Common types and constants used throughout Trace Modules All code. *)
(**********************************************************************)


(*************)
(* CONSTANTS *)
(*************)

CONST
  MAX_HOOK_QTY = 8;            (* Maximum number of total entry/exit *)
                               (* hooks for Trace Modules All.       *)


(********************)
(* TYPE DEFINITIONS *)
(********************)
```

```
TYPE

  VAL_MSK_TYPE = RECORD
    VAL: S_INT;
    MSK: S_INT;
    KIND: S_INT                (* PROC_ENTRY, PROC_EXIT legal here.  *)
  END;

  HOOK_REC_TYPE = RECORD
    HOOK_QTY: S_INT;
    HOOK: ARRAY [0..MAX_HOOK_QTY-1] OF VAL_MSK_TYPE;
  END;

(************************* End of document ****************************)
CONST

(*
              *****************************************
              ***** Control Word/Byte Commands *****
              *****************************************
                                                              *)

(*
                      ***********************
                      ***** CONTROL_1 *****
                      ***********************
                                                              *)

  HOLD_LME        = 0400H; (* Set bit in CONTROL_1:  drive LME false -
                             same bit pattern as R_H_LME in
                             FEATURE_ARRAY! *)

  RECEIVING_LME   = 0080H; (* Test bit in CONTROL_1:  if set, then on
                             the bus - same bit pattern as
                             RECEIVE_LME in FEATURE_ARRAY! *)

(*
                      ***********************
                      ***** CONTROL_2 *****
                      ***********************
                                                              *)

  SYNC_INIT_16    = 0111H; (* Command for CONTROL_2:  synchronous/
                              forced halt and mask upper 8 bits of
                              address bus for FSR *)

  SYNC_INIT_20    = 0110H; (* Command for CONTROL_2:  synchronous/
                              forced halt and mask upper 4 bits of
                              address bus for FSR *)

  SYNC_INIT_24    = 0010H; (* Command for CONTROL_2:  synchronous/
                             forced halt and use all 24 bits of
                             address bus for FSR *)

  SYNC_RUN        = 0008H; (* Set bit in CONTROL_2:  synchronous run
                             mode *)

  NORM_RUN        = 0020H; (* Set bit in CONTROL_2:  normal run/halt
                             mode *)

  LOAD_MODE       = 4000H; (* Set bit in CONTROL_2:  put hardware in
                             load mode *)

  TRANS_MODE      = 0C000H; (* Clear bits in CONTROL_2:  put hardware in
                              transition mode *)

  MEAS_MODE       = 8000H; (* Set bit in CONTROL_2:  put hardware in
                             measurement mode *)

  GEN_FSR_MEAS_MD = 0400H; (* Set bit in CONTROL_2:  put function
                             generators/FSR in measurement mode *)

  RELEASE_EMUL    = 0002H; (* Clear bit in CONTROL_2:  release emulation
                             break *)
```

```
(*
                    ************************
                    ***** CONTROL_BYTE *****
                    ************************
                                                                    *)

 MEM_LOAD_MODE   = 00C2H; (* Clear bits in CONTROL_BYTE:  memory in
                            load/unload mode, FP counter counting
                            states *)

 MEM_MEAS_MODE   = 0040H; (* Set bit in CONTROL_BYTE:  memory in
                            measurement mode *)

 MAC_TRANSPARENT = 0020H; (* Clear bit in CONTROL_BYTE:  memory adrs
                            counter turned transparent mode *)

(*
                    ********************
                    ***** ACQ_BYTE *****
                    ********************
                                                                    *)

 (* Note:  only lower 6 bits are significant for the ACQ_BYTE *)

 CNT_MEAS_MODE   = 0034H; (* Command for ACQ_BYTE:  put micro-code
                            occurance counters in measurement mode and
                            enable latches *)

 CNT_UNLD_MODE   = 003DH; (* Command for ACQ_BYTE:  put micro-code
                            occurance counters in unload mode and
                            disables latches ( used to be 0035H ) *)

 TALK_TO_MAPPER  = 0009H; (* Command for ACQ_BYTE:  set up to talk
                            to mapper RAMs *)

 DISABLE_CNTRS   = 003FH; (* Command for ACQ_BYTE:  talk to mapper
                            RAMs and disable counters *)

 LAB_PROTO_FIX   = 0029H; (* Command for ACQ_BYTE:  not necessary
                            for production boards but necessary
                            for lab prototype boards *)
CONST

(*
                    *********************************
                    ***** Error Code Constants *****
                    *********************************
                                                                    *)

 QUIET_ERROR     = -100; (* Someone else's error *)

 (* Emulation semi-fatal errors *)

 NO_XFR_ADRS     = -31; (* No transfer address *)

 ILL_SW_BREAK    = -30; (* Illegal software break *)

 CANT_GET_MON    = -29; (* Can't access monitor *)

 NOT_IN_MONITOR  = -28; (* Emulator not in monitor *)

 NO_MONITOR      = -27; (* No emulation monitor *)

 EMUL_PROBLEM    = -26; (* Emulation problems *)

 (* Controller semi-fatal errors *)

 VAR_NOT_FOUND   = -19; (* Dynamic variable not active or not scoped *)

 FRAME_UNDERFLOW = -18; (* Frame stack underflow *)

 FRAME_OVERFLOW  = -17; (* Frame stack overflow *)

 CANT_MAKE_FRAME = -16; (* Stack information inaccessible *)
```

```
(* Emulation/Controller fatal errors *)

UNIMP_MEAS     = -15; (* Unimplemented measurement *)

NO_DISABLE_SEQ = -8; (* Disable sequence not allowed *)

OUT_OF_STATES  = -7; (* Out of sequence states *)

FUNC_OVERFLOW  = -6; (* Function description overflow *)

OUT_OF_FSR     = -5; (* Out of fast sequencer resources *)

OUT_OF_H_RSRCS = -4; (* Out of high level resources *)

OUT_OF_L_RSRCS = -3; (* Out of low level resources *)

CORRUPT_USER   = -2; (* Corrupt measurement structure *)

NOT_REAL_TIME  = -1; (* Measurement is non-real-time *)

(* Controller status *)

NO_ERROR       = 0; (* No error:  done *)

KEEP_GOING     = 100; (* No error:  don't stop yet *)
CONST

(*
                  **************************************
                  ***** Fast Sequencer Constants *****
                  **************************************
                                                              *)

  SAVE_SUM       = 00000000H; (* Save in accumulator *)

  DONT_SAVE_SUM  = 00000400H; (* Don't save in accumulator *)

  FORCE_ZERO_OP  = 00000100H; (* Force zero operand *)

  ADD_ACCUM_OP   = 00000200H; (* Add accumulator *)

  ADD_EM_ADRS_OP = 00000000H; (* Add emulation address *)

  NO_LOAD        = 000000C0H; (* Don't load any AMEs *)

  LOAD_EQ_LM     = 00000040H;(* Load equate AME lower mask *)

  LOAD_EQ_UM     = 00000060H;(* Load equate AME upper mask *)

  LOAD_EQ_LV     = 00000050H;(* Load equate AME lower value *)

  LOAD_EQ_UV     = 00000070H;(* Load equate AME upper value *)

  LOAD_RG_LM     = 00000080H;(* Load range AME lower mask *)

  LOAD_RG_UM     = 000000A0H;(* Load range AME upper mask *)

  LOAD_RG_LV     = 00000090H;(* Load range AME lower value *)

  LOAD_RG_UV     = 000000B0H;(* Load range AME upper value *)
CONST

(*
                     ******************************
                     ***** Debug Option Codes *****
                     ******************************
                                                              *)

  DEBUG_OFF      = 0; (* No debug *)

  DEBUG_FOOTDC   = 1; (* Put FOOTDC out on the disc *)

  DEBUG_TRACEMOD = 2; (* Use regular trace modules *)
```

```
 DEBUG_TRACESTA = 3; (* Output break info for trace statements *)

 DEBUG_TRACEDAT = 4; (* Output break info for trace statements *)
CONST

(*
          **********************************************
          ***** Control and Structure Constants *****
          **********************************************
                                                              *)

 MAX_SYMS   = 10; (* Maximum number of symbols allowed in user
                     structure *)

(*
                   ****************************
                   ***** Status Constants *****
                   ****************************
                                                              *)

 READ       = 1; (* Code for read access *)

 WRITE      = 2; (* Code for write access *)

 READ_WRITE = 3; (* Code for read/write access *)

 OPCODE     = 4; (* Code for opcode fetch *)

(* ON_ENTRY must = READ, ON_EXIT must = WRITE, ON_BOTH must =
   READ_WRITE for the symbol table builder to work correctly *)

 ON_ENTRY   = READ; (* Code for entry access *)

 ON_EXIT    = WRITE; (* Code for exit access *)

 ON_BOTH    = READ_WRITE; (* Code for entry/exit access *)

TYPE

(*
                    *************************
                    ***** Shared Types *****
                    *************************
                                                              *)

 INT = SIGNED_16; (* Here for ICMD_DATA:SODAMON *)

 S_INT = SIGNED_16;

 L_INT = INTEGER;

 S_INT_PTR = ^S_INT;

 PTR = ^L_INT; (* Here for ICMD_DATA:SODAMON *)

 VECTOR0_7 = ARRAY [ 0..7 ] OF S_INT; (* Here for ICMD_DATA:SODAMON *)

(*
                 ************************************
                 ***** Control Word/Byte Types *****
                 ************************************
                                                              *)

 CNTRLLR_TYPES = ( CONTROL_1, CONTROL_2, CON   _BYTE, CONTROL_RESET,
                  ACQ_BYTE );

 CNTRL_ARRAY_TYPE = ARRAY [ CNTRLLR_TYPES ] OF L_INT;

(*
                   ***************************
                   ***** Flag Word Types *****
                   ***************************
                                                              *)

 FLAG_TYPES = ( FLAG_1, FLAG_2, FLAG_3 );
```

```
FLAG_1_BITS = ( SEARCH_DONE_BIT, T_TERM_BIT, O_TERM_BIT,
                IMG_STIM_BIT, MEM_NOT_FULL_BIT, FSR_STOP_BIT,
                SYS_HALT_BIT, FAC_BIT,
                START_BIT, T_COUNT_BIT, T_LOAD_BIT, OCCUR_BIT,
                COUNT_BIT, STORE_BIT, STOP_BIT, NOT_SEARCH_BIT );

FLAG_1_SET = SET OF FLAG_1_BITS;

FLAG_2_BITS = ( NOT_FSR_1, NOT_FSR_2, NOT_FSR_3, NOT_FSR_4,
                A12, A13, A14, A15,
                EQZ_OUT_BIT, EQV_OUT_BIT, NOT_LEV_OUT_BIT,
                NOT_GEZ_OUT_BIT, EQZ_OUT_BIT1, EQV_OUT_BIT1,
                NOT_SEQ_STOP, NOT_FSR_0 );

(* NOT_SEQ_STOP is really NOT_SEQ_START.  The flag is used to
   recognize disable conditions.  It pairs up with the SEQUENCE_STOP
   output of the function generators *)

FLAG_2_SET = SET OF FLAG_2_BITS;

FLAG_3_BITS = ( B8, B9, B10, B11, B12, B13, B14, B15,
                Y_GEN_0, Y_GEN_1, Y_GEN_2, Y_GEN_3, X_GEN_0, X_GEN_1,
                X_GEN_2, X_GEN_3 );

FLAG_3_SET = SET OF FLAG_3_BITS;

FLAG_ARRAY_TYPE = ARRAY [ FLAG_TYPES ] OF S_INT;

(*
                 ************************************
                 ***** Symbol Descriptor Types *****
                 ************************************
                                                                  *)

NUM_SYMS = 0..MAX_SYMS;

SYM_INDEX_SET = SET OF NUM_SYMS;

SYM_REC_TYPE = RECORD
                 DESCRIP_INDEX:  S_INT; (* Index into measurement
                                          structure of symbol *)
                 MEAS_SIZE:  L_INT  (* Size of symbol + any adjacent
                                       symbols above it:  0 if not
                                       to be traced *)
               END; (* Of record *)

SYM_ARRAY_TYPE = ARRAY [ 0..MAX_SYMS-1 ] OF SYM_REC_TYPE;

SYM_DESCRIPS = RECORD
                 SYMBOL_COUNT:  S_INT; (* Number of unique
                          s.  ls *)
  SYMBOL_ARRAY:  SYM_ARRAY_TYPE  (* Array of indeces to
                                    unique symbols *)
END; (* Of record *)
CONST

(*
             *********************************************
             ***** Control and Structure Constants *****
             *********************************************
                                                                  *)

 MAX_LL_RESOURCES = 12; (* Number of supported low level resources *)

 MAX_HL_RESOURCES = 10; (* Number of supported high level resources *)

 MAX_LINE_COUNT   = 255; (* Maximum number of lines we can count *)

 MAX_MAPPER       = 4095; (* Maximum mapper RAM number *)

 MAX_FUNC_INDEX   = 15; (* Maximum input function index:  supports
                          MAX_FUNC_INDEX+1 # of input terms *)

 MAX_SEQ_STATE    = 5; (* Maximum sequence state allowed:  ie from
                          0 up to this *)
```

```
TYPE

(*
                    *************************
                    ***** Signal Types *****
                    *************************
                                                        *)

 VALUE_MASK_REC = RECORD
                    LOWER_MASK:  L_INT; (* Lower bound mask *)
                    LOWER_VALUE:  L_INT; (* Lower bound value *)
                    UPPER_MASK:  L_INT; (* Upper bound mask *)
                    UPPER_VALUE:  L_INT  (* Upper bound value *)
                  END; (* Of record *)

 VALUE_MASK_PTR = ^VALUE_MASK_REC;

 CONDITION_TYPE = ( ON, OFF, DONT_CARE );

 POLARITY_TYPE = ( HIGH, LOW );

 CONDITION_REC = RECORD
                   CONDITION:  CONDITION_TYPE; (* Description of this
                                                 output signal's
                                                 condition *)
                   TRUE_POLARITY:  POLARITY_TYPE; (* True polarity
                                                   for this signal *)
                   MASK:  L_INT  (* Appropriate bit mask for this
                                   signal *)
                 END; (* Of condition record *)

(*
                 **************************************
                 ***** Low Level Resource Types *****
                 **************************************
                                                        *)

 LL_RESOURCE_NUMS = 0..MAX_LL_RESOURCES-1;
 LOW_LEVEL_SET = SET OF LL_RESOURCE_NUMS;

 LL_TYPE = ( DATA_EQUATE, DATA_RANGE, ADDRESS_EQUATE, ADDRESS_RANGE,
           OPCODE_EQUATE );

 LL_SIGNALS = ( GE_LO, EQ_LO, EQ_HI, LE_HI );

 LL_OUT_ARRAY = ARRAY [ LL_SIGNALS ] OF CONDITION_REC;

 LL_RESOURCE = RECORD

               (* Resource identification *)

                 RESOURCE_TYPE:  LL_TYPE; (* Type of low level
                                            resource *)
                 LOAD_PTR:  VALUE_MASK_PTR; (* Ptr to resource's
                                              load location *)
               (* Resource allocation *)

                 LO_TRACE_ID:  S_INT; (* I.D. of what we're
                                        watching with lower bound:
                                        -1 indicates not used *)
                 HI_TRACE_ID:  S_INT; (* I.D. of what we're
                                        watching with upper bound:
                                        -1 indicates not used *)

               (* Resource programmed inputs *)

                 LO_BOUND_MASK:  L_INT; (* Lower bound equate mask *)
                 LO_BOUND_VALUE:  L_INT; (* Lower bound equate value *)
                 HI_BOUND_MASK:  L_INT; (* Upper bound equate mask *)
                 HI_BOUND_VALUE:  L_INT; (* Upper bound equate value *)

               (* Resource outputs *)
```

```
              LL_OUTPUT:  LL_OUT_ARRAY  (* Description of outputs
                                           to drive high level
                                           resources *)
            END; (* Of low level resource record *)

 LL_ARRAY_TYPE = ARRAY [ LL_RESOURCE_NUMS ] OF LL_RESOURCE;

(*
               *****************************************
               ***** Misc. Driver Resource Types *****
               *****************************************
                                                                *)

 MISC_DRIVERS = ( OCCUR_TERM, EXT_STIM, TIMER_TERM, FSR,
                  I_FB_0, I_FB_1, I_FB_2, I_FB_3 );

 MISC_SET = SET OF MISC_DRIVERS;

 (* TIMER_TERM through I_FB_3, ie signals going to the function
    generators, do not use CONDITION field of CONDITION_REC.  I left
    it in there because of consistency and the fact that if the load
    algorithm changes, the field becomes necessary again *)

 MISC_ARRAY_TYPE = ARRAY [ MISC_DRIVERS ] OF CONDITION_REC;

(*
               *****************************************
               ***** High Level Resource T     , *****
               *****************************************
                                                                *)

 HL_RESOURCE_NUMS = 0..MAX_HL_RESOURCES-1;

 HIGH_LEVEL_SET = SET OF HL_RESOURCE_NUMS;

 LOW_SIG_ARRAY = ARRAY [ LL_SIGNALS ] OF LOW_LEVEL_SET;

 HL_RESOURCE = RECORD

              (* Resource identification *)

                LOAD_PTR:  VALUE_MASK_PTR; (* Ptr to resource's
                                              load location *)

              (* Resource allocation / inputs *)

      (* All sets empty indicates resource not being used.  You might
         be asking yourself why I didn't use a trace I.D. like I did
         for the low level resources.  The answer is simple:  many
         low level resources can be fed through one high level resource,
         so many I.D.s may be related to one high level resource *)

                LL_SETS:  LOW_SIG_ARRAY; (* Array of sets, one per
                                            low level signal, of low
                                            level resources driving
                                            this high level resource
                                            with that signal *)
                EXTRA_SET:  MISC_SET; (* Set of misc. drivers of
                                         this resource *)

              (* Resource outputs *)

 (* The high level resource signals going to the function generators
    do not use CONDITION field of CONDITION_REC.  I left it in there
    because of consistency and the fact that if the load algorithm
    changes, the field becomes necessary again *)

                HL_OUTPUT:  CONDITION_REC  (* Description of output to
                                              drive function
                                              generator *)
            END; (* Of high level resource record *)

 HL_ARRAY_TYPE = ARRAY [ HL_RESOURCE_NUMS ] OF HL_RESOURCE;
```

```
(*
                *********************************
                ***** Counter Resource Types *****
                *********************************
                                                              *)

COUNT_ADRS_ARRAY = ARRAY [ 0..MAX_LINE_COUNT-1 ] OF L_INT;

CNT_REC_TYPE = RECORD
                NUM_LINES:  S_INT; (* Number of lines to count *)
                LINE_ADRS:  COUNT_ADRS_ARRAY  (* Array of addresses
                                                 to count *)
              END; (* Of record *)

CNT_REC_PTR = ^CNT_REC_TYPE;

MAPPER_TYPE = ARRAY [ 0..MAX_MAPPER ] OF S_INT;
(*
            ********************************************
            ***** Function Generator Resource Types *****
            ********************************************
                                                              *)

ENTRY_TYPE = ( OPERAND_, AND_, OR_, NOT_, END_ );

IN_REC = RECORD
           TAG:  ENTRY_TYPE;
           OPERAND:  CONDITION_REC
         END; (* Of record *)

IN_ARRAY_TYPE = ARRAY [ 0..MAX_FUNC_INDEX ] OF IN_REC;

STATE_TYPE = S_INT;

NUM_FB_BITS = 0..4;

OUTPUT_FUNCTIONS = ( START_QUAL, TIMER_COUNT, TIMER_LOAD, OCCUR,
                     COUNT, STORE, STOP, SEARCH, SEQUENCE_STOP,
                     O_FB_0, O_FB_1, O_FB_2, O_FB_3 );

(* SEQUENCE_STOP is really SEQUENCE_START.  The output is used to
   recognize disable conditions.  It pairs up with the NOT_SEQ_STOP
   flag in the flag array *)

OUT_MASK_ARRAY = ARRAY [ OUTPUT_FUNCTIONS ] OF L_INT;

OUT_POL_ARRAY = ARRAY [ OUTPUT_FUNCTIONS ] OF POLARITY_TYPE;

OUT_ARRAY_TYPE = ARRAY [ OUTPUT_FUNCTIONS ] OF CONDITION_REC;

OUT_SET_TYPE = SET OF OUTPUT_FUNCTIONS;

I_O_REC_PTR = ^I_O_REC;

I_O_REC = RECORD
            INPUT_:  IN_ARRAY_TYPE; (* Description of true function *)
            OUTPUT_:  OUT_ARRAY_TYPE; (* Description of output
                                         functions when input function
                                         is true *)
            INPUT_INDEX:  S_INT; (* Current index into INPUT_ array *)
            OUTPUT_WORD:  L_INT; (* Created output word from above
                                    output description array *)
            NEXT_STATE:  STATE_TYPE; (* Next state to go to when
                                        input function is true *)
            NEXT_I_O_PTR:  I_O_REC_PTR  (* Pointer to next
                                           condition *)
          END; (* Of state I/O record *)

STATE_REC_PTR = ^STATE_REC;

STATE_REC = RECORD

            (* State identification *)

              NEXT_STATE_PTR:  STATE_REC_PTR; (* Ptr to next state
                                                 record *)
```

```
        CUR_STATE:  STATE_TYPE; (* Current state number *)

       (* State inputs:  functional description /
        state programmed outputs *)

       I_O_PTR:  I_O_REC_PTR  (* Description of resources
                                 driving this state and
                                 dedicated functions this
                                 state is to drive *)
      END; (* Of state machine record *)

FUNC_GEN_TYPES = ( X, Y );

FUNC_RESOURCE = RECORD

          (* Resource identification *)

            LOAD_PTR:  L_INT; (* Ptr to resource's
                                 load location *)
            LEGAL_HL_SET:  HIGH_LEVEL_SET; (* Set of HL
                                 resources allowed to drive
                                 this function generator *)

          (* Control word bit masks *)

            OFF_VALUE:  L_INT; (* Value to turn this function
                                 generator off *)
            RAM_0_ADRS_MASK:  L_INT; (* Bit mask to force adrs
                                 to 0 *)

          (* Resource output bit masks *)

            OUTPUT_MASKS:  OUT_MASK_ARRAY; (* Array of masks
                                 for the output
                                 functions *)
            OUTPUT_POLARS:  OUT_POL_ARRAY; (* Array of
                                 polarities for
                                 the output
                                 functions *)

          (* Resource state machine *)


            NUM_WINDOW_BITS:  NUM_FB_BITS; (* Number of feed
                                 back bits used
                                 for windows *)
            NUM_STATE_BITS:  NUM_FB_BITS; (* Number of feed
                                 back bits used
                                 for states *)
            STATE_MACH_PTR:  STATE_REC_PTR  (* Ptr to state
                                 machine:  null
                                 indicates not
                                 used *)
          END; (* Of function generator resource record *)

F_G_ARRAY_TYPE = ARRAY [ FUNC_GEN_TYPES ] OF FUNC_RESOURCE;

(*
          *******************************************
          ***** Fast Sequencer Resource Types *****
          *******************************************
                                                        *)

 (* Note:  SEQ_STOP is really SEQ_START and is not supported.  It will
    cause serious problems if used - see SEQUENCE_STOP output of the
    function generators *)
FSR_LL_TYPE = ( EQ_LO_RANGE, EQ_HI_RANGE, LE_HI_RANGE, GE_LO_RANGE,
          EQ_LO_EQUATE, EQ_HI_EQUATE, SEQ_STOP );

(* All input signals going to the fast sequencer do not use
   CONDITION field of CONDITION_REC.  I left it in there because
   of consistency and the fact that if the load algorithm changes,
   the field becomes necessary again *)
```

```
FSR_INPUT_ARRAY = ARRAY [ FSR_LL_TYPE ] OF CONDITION_REC;

FOUTPUT_FUNCTIONS = ( STORE_FSR, STOP_FSR, FSRX, FSRY );

FOUT_MASK_ARRAY = ARRAY [ FOUTPUT_FUNCTIONS ] OF L_INT;

FOUT_POL_ARRAY = ARRAY [ FOUTPUT_FUNCTIONS ] OF POLARITY_TYPE;

FOUT_ARRAY_TYPE = ARRAY [ FOUTPUT_FUNCTIONS ] OF CONDITION_REC;

FI_O_REC_PTR = ^FI_O_REC;

FI_O_REC = RECORD
           INPUT_:  IN_ARRAY_TYPE; (* Description of true
                                      function *)
           OUTPUT_:  FOUT_ARRAY_TYPE; (* Description of output
                                         functions when input
                                         function is true *)
           INPUT_INDEX:  S_INT; (* Current index into INPUT_
                                   array *)
           OUTPUT_WORD1:  L_INT; (* First created output word *)
           OUTPUT_WORD2:  L_INT; (* Second created output word *)
           NEXT_STATE:  STATE_TYPE; (* Next state to go to when
                                       input function is true *)
           NEXT_I_O_PTR:  FI_O_REC_PTR  (* Pointer to next
                                           condition *)
         END; (* Of fast sequencer state I/O record *)

FSTATE_REC_PTR = ^FSTATE_REC;

FSTATE_REC = RECORD

             (* State identification *)

             NEXT_STATE_PTR:  FSTATE_REC_PTR; (* Ptr to next state
                                                 record *)
             CUR_STATE:  STATE_TYPE; (* Current state number *)

             (* State inputs:  functional description /
                state programmed outputs *)

             I_O_PTR:  FI_O_REC_PTR  (* Description of resources
                                        driving this state and
                                        dedicated functions this
                                        state is to drive *)
           END; (* Of fast sequencer state machine record *)

FSR_REC_TYPE = RECORD

               (* Resource identification *)

               LOAD_PTR:  L_INT; (* Ptr to resource's load
                                    location *)
               (* Control word bit masks

               OFF_VALUE:  L_INT; (* Value to turn the fast
                                     sequencer off *)
               RAM_O_ADRS_MASK:  L_INT; (* Bit mask to force adrs
                                           to 0 *)

               (* Fast sequencer initial condition *)

               ADDER_VAL:  L_INT;
               LO_RG_MASK:  L_INT; (* Range resource init *)
               LO_RG_VAL:  L_INT;
               HI_RG_MASK:  L_INT;
               HI_RG_VAL:  L_INT;
               LO_EQ_MASK:  L_INT; (* Equate resource init *)
               LO_EQ_VAL:  L_INT;
               HI_EQ_MASK:  L_INT;
               HI_EQ_VAL:  L_INT;

               (* Fast sequencer inputs *)

               FSR_INPUTS:  FSR_INPUT_ARRAY; (* Array describing
                                                possible inputs *)
```

```
        (* Fast sequencer output bit masks *)

        OUTPUT_MASKS:  FOUT_MASK_ARRAY; (* Array of masks
                                          for the output
                                          functions *)
        OUTPUT_POLARS:  FOUT_POL_ARRAY; (* Array of
                                          polarities for
                                          the output
                                          functions *)

        (* Fast sequencer state machine *)

        STATE_MACH_PTR:  FSTATE_REC_PTR  (* Ptr to state
                                           machine:  null
                                           indicates not
                                           used *)
      END; (* Of fast sequencer resource record *)

(*
            **************************
            ***** Feature Types *****
            **************************
                                                          *)

 (* Note 1:  RECEIVE_LTE and RECEIVE_HTR = RECEIVE_LSE, ie if both
    LTE and HTR are specified to be received, it means receive LSE *)
 (* Note 2:  BREAK_ON_SEARCH is not supported, and will cause serious
    problems if used *)
 (* Note 3:  R_H_LME has the same bit pattern as HOLD_LME in CMD_CONST!
    R_H_LME is not really a feature, so it should not be set ON/OFF
    from this array anyway.  It serves as a placeholder.  Another
    duplicate bit pattern is RECEIVE_LME here and RECEIVING_LME in
    CMD_CONST!  This one I must apologize for.  It came about when
    HALT_HW needed to know whether Soda was on IMB and the routine
    didn't have access to the FEATURE_ARRAY *)

 FEATURE_TYPES = ( DRIVE_SMC, DRIVE_LSE, DRIVE_LTE, DRIVE_HTR,
 (* CONTROL_1 *)    DRIVE_LME, R_H_LME, RECEIVE_LTE, RECEIVE_HTR,
                    RECEIVE_LME, STOP_MEM_FULL, START_ARM_SEQ,
                    START_ARM_STOP, START_ARM_   RE, START_ARM_COUNT,
                    START_ARM_OCCUR, START_ARM_TIMER,
 (* CONTROL_2 *)    BREAK_ON_SEARCH, TIME_TIME_MODE, BREAK_ON_STOP,
 (* CONTROL_BYTE *) FPC_TIME_MODE );

 FEATURE_REC = RECORD
                 CONTROLLER:  CNTRLLR_TYPES; (* Control word in which
                                                feature is found *)
                 STATUS:  CONDITION_REC  (* Condition of signal *)
               END; (* Of record *)

 FEAT_ARRAY_TYPE = ARRAY [ FEATURE_TYPES ] OF FEATURE_REC;

 FEAT_SET_TYPE = SET OF FEATURE_TYPES;

(*
               ***************************************
               ***** Trace Specification Types *****
               ***************************************
                                                          *)

 HW_SPEC_REC = RECORD
                 LOW_LEVELS:  LL_ARRAY_TYPE; (* Low level resources *)
                 HIGH_LEVELS:  HL_ARRAY_TYPE; (* High level
                                                 resources *)
                 FAST_SEQUENCER:  FSR_REC_TYPE; (* Fast sequencer *)
                 MICRO_COUNTERS:  CNT_REC_PTR; (* Ptr to micro-code
                                                  occurance counters *)
                 FUNC_GENERATORS:  F_G_ARRAY_TYPE; (* Function
                                                      generators *)
                 MISC_SIGNALS:  MISC_ARRAY_TYPE; (* Misc. signals *)
                 FEATURES:  FEAT_ARRAY_TYPE; (* Extra features *)
                 TIME_COUNTER:  L_INT; (* Main timer counter *)
                 OCCUR_COUNTER:  S_INT;  (* Main occurance count *)
                 START_MAC:  S_INT; (* Starting memory adrs counter *)
```

```
              RAM_DIRTY:  BOOLEAN;  (* Function generator/fast
                                       sequencer RAM dirty flag *)
              RSRC_DIRTY:  BOOLEAN  (* Resource dirty flag *)
            END; (* Of hardware specification record *)

SPEC_STATUS = ( READY, ACTIVE, FINISHED );

UN_TYPES = ( UN_NOTHING, UN_ENABLES, UN_TRACE_VAR, UN_TRACE_STAT,
             UN_TRACE_RSTAT, UN_TRACE_MODS, UN_TRACE_DATA,
             UN_TRACE_XXX, UN_TRACE_BRK, UN_TIME_MODS,
             UN_TRACE_AMODS, UN_COUNT_STAT );

TRACE_SPEC_PTR = ^TRACE_SPEC_REC;

TRACE_SPEC_REC = RECORD
                   PRIORITY:  S_INT; (* Priority of specification:
                                   0 = sequence state 0 ( to be
                                       loaded 1st ),
                                   1 = sequence state 1 ( to be
                                       loaded 2nd ), etc.,
                                  16 = actual measurement ( last
                                       spec to load )          *)
                   STATUS:  SPEC_STATUS; (* Current status of spec *)
                   UN_REQUEST:  UN_TYPES; (* Unload request code *)
                   HW_SPEC:  HW_SPEC_REC; (* Hardware specification *)
                   NEXT_SPEC:  TRACE_SPEC_PTR  (* Pointer to next
                                                 trace specification *)
                 END; (* Of trace specification record *)
CONST

(*
             *******************************************
             ***** Control and Structure Constants *****
             *******************************************
                                                                 *)

  MAX_UNLD_COUNT = 4095; (* The maximum # of states to uload for a
                            a measurement:  NEVER more than 4095! *)

  MAX_INDIRECTS  = 7; (* The maximum # of levels of indirection
                         provided for *)

  MAX_RECURSION = 256; (* The maximum # of levels of recursion
                          supported *)

  MAX_PARENTS   = 14; (* Maximum # of parent procedures allowed *)

  MAX_SEGMENTS  = 8; (* Maximum # of segment offset registers in a
                        frame record *)

  MAX_FRAME_TOP = MAX_RECURSION-1; (* Max. # entries-1 in frame stack:
                                      first entry is first recursive
                                      level *)

  MAX_TIME_TOP = MAX_RECURSION; (* Max. # entries-1 in time stack:
                                   first entry is current level *)

(*
                  *******************************
                  ***** Data Type Constants *****
                  *******************************
                                                                 *)

 (* Negative values indicate don't write it out to the disc *)

  D_ZONE         = -13; (* Data type for stack unbuilt to exit *)

  C_ZONE         = -12; (* Data type for stack built to stack unbuilt *)

  B_ZONE         = -11; (* Data type for stack change to stack built *)

  A_ZONE         = -10; (* Data type for entry to stack change *)

  PSEUDO_EXIT    = -5; (* Data type for exit-exit offset *)
```

```
  PSEUDO_ENTRY   = -4; (* Data type for entry+entry offset *)

  STACK_ADRS     = -2; (* Data type for a stack address *)

  GARBAGE        = -1; (* Data type for garbage *)

  DATA_BOUND     = 0; (* Data type for data boundary *)

  STATIC_VAR     = 1; (* Data type for a static variable *)

  DYNAMIC_VAR    = 2; (* Data type for a dynamic variable *)

  (*             = 3;    Reserved *)
  PROC_ENTRY     = 4; (* Data type for procedure entry *)

  PROC_EXIT      = 5; (* Data type for procedure exit *)

  STATEMENTS     = 6; (* Data type for statements *)

  FRAME_DATA     = 10; (* Data type for procedure frame *)

  MSG_DATA       = 12; (* Data type for display message *)

  TIME_DATA      = 20; (* Time measurement information *)

  COUNT_DATA     = 21, (* Count measurement information *)

TYPE

(*
                    ****************************
                    ***** HW Sextet Types *****
                    ****************************
                                                              *)

  DOUBLE_ARRAY = ARRAY [ 0..1 ] OF L_INT;

  STORED_FLAGS = ( FP_COUNT, NORMAL_STORE, FSR_Y, FSR_X );

  FLAG_SET = SET OF STORED_FLAGS;

  SEXTET_REC_TYPE = RECORD
                    PC:  L_INT; (* PC value *)
                    ADRS:  L_INT; (* Address *)
                    COUNT:  DOUBLE_ARRAY; (* Time/state count *)
                    DATA:  S_INT; (* Emulation data *)
                    STATUS:  S_INT; (* Emulation status *)
                    FLAGS:  FLAG_SET  (* Stored HW flags *)
                  END; (* Of record *)

(*
                   *******************************
                   ***** Stack Frame Types *****
                   *******************************
                                                              *)

  PARENT_REC = RECORD
               SUBNO:  S_INT; (* Subroutine number of parent *)
               STACK_ADRS:  L_INT  (* Stack address of parent *)
             END; (* Of record *)

  (* Last entry in frame array is the main program:  SUBNO = 0 *)
  FRAME_ARRAY_TYPE = ARRAY [ 0..MAX_PARENTS ] OF PARENT_REC;

  SEG_ARRAY_TYPE = ARRAY [ 0..MAX_SEGMENTS-1 ] OF L_INT;

  FRAME_REC_TYPE = RECORD
                   SEGMENTS:  SEG_ARRAY_TYPE; (* Segment registers *)
                   FRAME:  FRAME_ARRAY_TYPE  (* Frame *)
                 END; (* Of record *)

  FRAME_PTR_TYPE = ^FRAME_REC_TYPE;

  FSTACK_INDEX   = -1..MAX_FRAME_TOP;
```

```
 FSTACK_TYPE    = ARRAY [ 0..MAX_FRAME_TOP ]   FRAME_PTR_TYPE;

 FSTACK_PTR_TYPE = ^FSTACK_TYPE;

 FSTACK_RETCODE = -1..1;

 FPACK_TYPE = RECORD
              CUR_FRAME:  FRAME_PTR_TYPE; (* Ptr to current frame *)
              STACK:  FSTACK_TYPE; (* Frame stack *)
              INDEX:  FSTACK_INDEX; (* Index into stack *)
              OFC:  L_INT; (* Overflow count *)
              REC_NUM:  S_INT  (* Record # of prev. frame *)
             END; (* Of record *)

(*
                *******************************
                ***** Indirect Array Types *****
                *******************************
                                                        *)

 I_LEVEL_TYPE = RECORD
                PTR_ADRS:  L_INT; (* Address of pointer *)
                PTR_DATA:  L_INT  (* What was in above adrs *)
               END; (* Of record *)

 I_ARRAY_TYPE = ARRAY [ 0..MAX_INDIRECTS-1 ] OF I_LEVEL_TYPE;

 I_INFO_TYPE = RECORD
               NUM:  S_INT; (* # levels of indirection *)
               LEVELS:  I_ARRAY_TYPE  (* Indirect levels *)
              END; (* Of record *)

 I_INFO_PTR = ^I_INFO_TYPE;

 TWIN_I_TYPE = RECORD
               HI_I:  I_INFO_PTR; (* Upper symbol's indirections *)
               LO_I:  I_INFO_PTR  (* Lower symbol's indirections *)
              END; (* Of record *)

(*
                    ***********************
                    ***** Timing Types *****
                    ***********************
                                                        *)

 TIME_REC_TYPE = RECORD
                 NUM_SAMPLES:  S_INT; (* Number of samples *)
                 CUM_TIME:  DOUBLE_ARRAY; (* Cumulative time *)
                 MIN_TIME:  DOUBLE_ARRAY; (* Minimum time *)
                 MAX_TIME:  DOUBLE_ARRAY; (* Maximum time *)
                 AVG_TIME:  DOUBLE_ARRAY  (* Average time *)
                END; (* Of record *)

 TIME_PTR_TYPE = ^TIME_REC_TYPE;

 TIME_ARRAY_TYPE = ARRAY [ 0..MAX_SYMS-1 ] OF TIME_PTR_TYPE;

 TSTACK_INDEX = -1..MAX_TIME_TOP;

 TSTACK_TYPE = ARRAY [ 0..MAX_TIME_TOP ] OF DOUBLE_ARRAY;

 TSTACK_PTR_TYPE = ^TSTACK_TYPE;
 TSTACK_RETCODE = -1..1;
CONST

(*
                ********************************
                ***** File Manager Constants *****
                ********************************
                                                        *)

 TRC_FILE_TYPE  = 8; (* Trace file type *)

 DISC_NO        = -1; (* File mgr code:  look on all LU for file *)
```

```
  BUFFER_SIZE    = 2; (* # sectors/DCB, ie 256 + 17 decimal word
                    long DCB *)

  MAX_REC_LENGTH = 128; (* Maximum record length *)

TYPE

(*
                    ******************************
                    ***** File Manager Types *****
                    ******************************
                                                            *)

  DCB_TYPE = S_INT;

  FNAME_ARRAY = ARRAY [ 0..7 ] OF S_INT;

  REC_TYPE = ARRAY [ 0..MAX_REC_LENGTH ] OF S_INT;

  REC_PTR_TYPE = ^REC_TYPE;

  FOOTDC_INFO_TYPE = RECORD
                     DCB:  DCB_TYPE; (* Trace file's DCB *)
                     OPEN_FLAG:  BOOLEAN; (* Flag indicating trace
                                      file is open *)
                     UPDATE_FLAG:  BOOLEAN; (* Flag indicating header
                                        should be updated *)
                     CENTER_REC:  S_INT; (* Center record # of trace
                                      file if center on trace *)
                     MIN_INDENT:  S_INT  (* Min. indentation:  ONLY
                                      used by trace modules! *)
                   END; (* Of FOOTDC info record *)
CONST

(*
                    ******************************
                    ***** Message Constants *****
                    ******************************
                                                            *)

  MAX_MSG_LENGTH = 31; (* Maximum word count of a message *)

  CLR_STATUS_MSG = 02000H; (* Don't stack on new message *)

  CLR_FINAL_MSG  = 04000H; (* Stack on new message and clear on next
                           keystroke *)

  CLR_ERROR_MSG  = 0C000H; (* Stack on new message and clear on next
                           keystroke *)

(* The following codes make uses of a redefined bit in the message
   code.  If you number the bits 0 to 15, bit 10 has been changed from
   the most significant time bit to mean stack the message but don't
   display it right away, ie call STACK_MESS instead of MESSAGE *)

  CLR_SFINAL_MSG = 04400H; (* Same as above only stack and don't
                           display until stack is popped *)

  CLR_SERROR_MSG = 0C400H; (* Same as above only stack and don't
                           display until stack is popped *)

TYPE

(*
                     ***************************
                     ***** Message Types *****
                     ***************************
                                                            *)

  MSG_LENGTH = 1..MAX_MSG_LENGTH;

  MSG_TEXT = ARRAY [ MSG_LENGTH ] OF S_INT;
```

```
 MSG_REC = RECORD
            LENGTH:  S_INT; (* Word length of message *)
            TEXT  :  MSG_TEXT (* Ascii text of message *)
          END; (* Of record *)

 MSG_PTR = ^MSG_REC;

 MSG_TABLE = ARRAY [ -35..20 ] OF MSG_PTR;
TYPE

(*
          *************************************************
          ***** Translator Measurement Data Structure *****
          *************************************************
                                                            *)

TOTAL_MEAS_REC = RECORD
                  START_PTR:  CMD_ARRAY_PTR; (* Ptr to structure
                                               describing start seq:
                                               nil if none *)
                  STOP_PTR:  CMD_ARRAY_PTR; (* Ptr to structure
                                              describing stop seq:
                                              nil if none *)
                  MEAS_PTR:  CMD_ARRAY_PTR; (* Ptr to structure
                                              describing measurement:
                                              NEVER nil *)
                  CMD_PTR:  CMD_REC_PTR; (* Ptr to structure
                                           describing cmd:
                                           NEVER nil *)
                  CONFIG_PTR:  CONFIG_REC_PTR  (* Ptr to structure
                                                 describing config:
                                                 NEVER nil *)
                END; (* Of total measurement record *)
CONST

(*
                      *****************************
                      ***** System Constants *****
                      *****************************
                                                            *)

  PRCSS_LO_PRI = 0; (* Priority for non-critical sections *)

  PRCSS_HI_PRI = -60; (* Priority for critical sections *)

TYPE

(*
               ***************************************
               ***** DPC Communication Structure *****
               ***************************************
                                                            *)

(* WARNING:  the structure declared below should never, never change.
   Everybody has a different declaration of it, ie it is not in a
   common INCLUDE file! *)

  REP_STRUCT = RECORD
                 STUFFING:  ARRAY [ 0..39 ] OF S_INT; (* Padding *)
                 HARDWARE_STATUS:  S_INT  (* Current hw status *)
               END; (* Of record *)

{ ICMD_DATA:SODAMON  }

{********************        command data stack       ********************}

{
| 0 .. 1 | 2 .. 3 | 4 .. 5 | 6 .. 7 | 8 .. 9 | A .. B | C .. D | E .. F |

VAR_OP, PROC_OP, LINE_OP, FILE_OP
-------------------------------------------------------------------------
| OPCODE | PROC # | FILE # | DISC # |  FLAGS | STATUS | LINE 1 | LINE 2 |
-------------------------------------------------------------------------
| PROC_NAME  - - - - - - - - - - - - - - - - - - - - - - - ->|
-------------------------------------------------------------------------
```

| FILE_NAME | | | | | | | |
|---|---|---|---|---|---|---|---|
| ADDRESS | | SIZE | | ENTRY ADDRESS | | EXIT ADDRESS | |
| DB PTR | | LENGTH | LANGUAGE | OFFSET | OFFSET | | |

STATE_OP

| | | | | | | | |
|---|---|---|---|---|---|---|---|
| OPCODE | ADDRS | | A MASK | | DATA | D MASK | STAT |
| S MASK | | | | | | | |
| | | | | | | | |
| | | | | | | | |
| | | | | | | | |

VALUE_OP

| | | | | | | | |
|---|---|---|---|---|---|---|---|
| OPCODE | VALUE | | REL_OP | | | | |
| | | | | | | | |
| | | | | | | | |
| | | | | | | | |
| | | | | | | | |

OFFSET

| | | | | | | | |
|---|---|---|---|---|---|---|---|
| OPCODE | OFFSETS. | | 1 | | 2 | | 3 |
| . | 4 | . | 5 | . | 6 | . | 7 |
| . | SIZES | . | 1 | . | 2 | . | 3 |
| . | 4 | . | 5 | . | 6 | . | 7 |
| . | | | | | | | |

PARENTS

| | | | | | | | |
|---|---|---|---|---|---|---|---|
| OPCODE | PROC_NUM | 1 | 2 | 3 | | 5 | 6 |
| 7 | 8 | 9 | 10 | 11 | 12 | 13 | 14 |
| STACK_OF | 1 | 2 | 3 | 4 | 5 | 6 | 7 |
| 8 | 9 | 10 | 11 | 12 | 13 | 14 | |
| | | | | | | | |

.IMES

| | | | |
|---|---|---|---|
| OPCODE | ADDRS . | 1 . | 2 . |
| 3 . | 4 . | 5 . | 6 . |
| 7 . | 8 . | 9 . | 10 . |
| 11 . | 12 . | 13 . | 14 . . |
| 15 . | 16 | 17 . | 18 . |

```
PROCS
---------------------------------------------------------------------------
| OPCODE |          |          | ENTRY  .      | 1       .      |
---------------------------------------------------------------------------
| 2       .      | 3       .      | 4       .      | 5       .      |
---------------------------------------------------------------------------
| 6       .      | 7       .      | 8       .      | EXIT    .      |
---------------------------------------------------------------------------
| 1       .      | 2       .      | 3       .      | 4       .      |
---------------------------------------------------------------------------
| 5       .      | 6       .      | 7       .      | 8       .      |
---------------------------------------------------------------------------

TRACE
VARIABLES      LAST_ACCESS    STATEMENTS       MODULES        DATA_FLOW
---------      -----------    ----------       -------        ---------
VAR_OP         VAR_OP         PARENTS          PARENTS        PARENTS
[OFFSET]       [OFFSET]       LINE_OP/PROC_OP  PROC_OP        PROC_OP
  ...            ...          TR_STA             ...          VAR_OP
TR_VAR         TR_ASN         EOL              FILE_OP        [OFFSET]
EOL            EOL                             PROCS            ...
                                                 ...            ...
                                               TR_MOD         TR_DAT
                                               EOL            EOL

DISPLAY        MODIFY
VARIABLE       VARIABLE
----------     -----------
VAR_OP         VALUE
[OFFSET]       VAR_OP
DISP_VAR       [OFFSET]
EOL            MOD_VAR
               EOL

COUNT
STATEMENTS
----------
PARENTS
LINE_OP/PROC_OP
LINES
  ...
CT_STA
EOL

TIME
MODULES
-------
PARENTS
MOD_OP
  ...
TI_MOD
EOL
}

CONST
    MAX_DATA_INDEX = 34;
TYPE
    CMD_DATA_INDEX = 0..MAX_DATA_INDEX;
    CMD_INDEX_SET = SET OF CMD_DATA_INDEX;
    OP_CODES = (
                TR_VAR,         { 0 trace variables}
                TR_ASN,         { 1 trace assignment}
                TR_DAT,         { 2 trace data_flow}
                TR_MOD,         { 3 trace modules}
                TR_STA,         { 4 trace statements}
                TR_XXX,         { 5 trace don't care}
                DISP_VAR,       { 6 display variable}
                MOD_VAR,        { 7 modify variable}
                TI_MOD,         { 8 time modules}
                TI_STA,         { 9 time statements}
                CT_MOD,         { A count modules}
                CT_STA,         { B count statements}
                BRK_ON,         { C break on}
                CD_ENA,         { D measurement enable}
```

```
         CD_DIS,          { E measurement disable}
         AT_RUN,          { F emulation run}
         COMMAND,         {10 measurement command boundary:  ^ }
         VAR_OP,          {11 variable symbol}
         PROC_OP,         {12 procedure symbol}
         LINE_OP,         {13 line range symbol}
         FILE_OP,         {14 file symbol}
         SYMBOL,          {15 symbol boundary:         ,      ^ }
         STATE_OP,        {16 address/data/status/dontcare op}
         VALUE_OP,        {17 value and relational op for compares}
         OFFSET,          {18 array of record offsets}
         PARENTS,         {19 array of procedure parents}
         LINES,           {1A array of source line entry points}
         PROCS,           {1B array of module entry/exit pairs}
         FOLLOWED_BY,     {1C followed_by operand}
         EOL              {1D end_of_command_line}
         );
CMD_DATA_TYPE = RECORD
     CASE OP_CODE : OP_CODES OF
     TR_VAR,
     TR_ASM,
     TR_DAT,
     TR_MOD,
     TR_STA,
     TR_XXX,
     DISP_VAR,
     MOD_VAR,
     TI_MOD,
     TI_STA,
     CT_MOD,
     CT_STA,
     CD_ENA,
     CD_DIS,
     BRK_ON,
     AT_RUN,
     COMMAND,
     EOL : (
         DUMMY1 : ARRAY[0..38] OF INT;
         );
     VAR_OP,
     PROC_OP,
     LINE_OP,
     FILE_OP : (
         PROC_NUM : INT; {0 if program}
         FILE_NUM : INT;
         DISC_NUM : INT;
         FLAGS : INT;    {data base flags field}
         STATUS : INT;   {B2=op_code,B1=write/exit,B0=read/entry}
         LINE1 : INT;
         LINE2 : INT;
         PROC_NAME : VECTOR0_7;
         FILE_NAME : VECTOR0_7;
         ADDRESS : INTEGER;          {both address and size are}
         SIZE : INTEGER;             {= -1 if offset array used}
         ENTRY : INTEGER;
         EXIT : INTEGER;
         DB_PTR : INTEGER;
         DB_LENGTH : INT;
         LANGUAGE : INT;
         ENTRY_OFFSET : INT;
         EXIT_OFFSET : INT;
         DUMMY2 : ARRAY[0..1] OF INT;
         );
     STATE_OP : (
         ADRS : INTEGER;
         ADRSMASK : INTEGER;
         DATA : INT;
         DATAMASK : INT;
         STAT : INT;
         STATMASK : INT;
         DUMMY3 : ARRAY[0..30] OF INT;
         );
     VALUE_OP : (
         VAL_VALUE : INTEGER;
```

```
            REL_OP : INT;   {B2=<,B1==,B0=>}
            DUMMY7 : ARRAY[0..35] OF INT;
            );
        OFFSET : (
            OFFSETS : ARRAY[0..8] OF INTEGER;
            SIZES : ARRAY[0..8] OF INTEGER;
            DUMMY4 : ARRAY[0..2] OF INT;
            );
        PARENTS : (
            PROC_NUMS : ARRAY[0..14] OF INT;
            STACK_OFFS : ARRAY[0..14] OF INT;
            DUMMY5 : ARRAY[0..8] OF INT;
            );
        LINES : (
            DUMMY6 : INT;
            ADDRS : ARRAY[0..18] OF INTEGER;
            );
        PROCS : (
            DUMMY8 : ARRAY[0..2] OF INT;
            ENTRYS : ARRAY[0..8] OF INTEGER;
            EXITS : ARRAY[0..8] OF INTEGER;
            )
            END;
   CMD_DATA_PTR = ^CMD_DATA_TYPE;
   CMD_DATA_ARRAY = ARRAY [CMD_DATA_INDEX] OF CMD_DATA_TYPE;
   CMD_ARRAY_PTR = ^CMD_DATA_ARRAY;

{********************      configuration structure      ********************}

   IMB_LINES = (NO_WAY_JOSE, TRIGGER, TRIGGER_ENABLE, STORAGE_ENABLE);

   RUN_COMMANDS = ( FROM_PC, FROM_ADRS, FROM_XFER, NO_RUN_CMD );

   AIMB_REC = RECORD
            DRIVE : IMB_LINES;
            RECEIVE : IMB_LINES;
            END;
   CONFIG_REC_TYPE = RECORD
            LENGTH : INT;   {structure length in words for file I/O}
            ABS_FILE : VECTOR0_7;
            ABS_DISC : INT;
            EMUL_ID : INT;
            COUNT_TIME : BOOLEAN;
            REAL_TIME : BOOLEAN;   {only this much goes to the disc}
            BREAK_MEAS_COMP : BOOLEAN;
            RUN_AT_EXEC :  BOOLEAN;
            RUN_CMD : RUN_COMMANDS;
            RUN_ADRS :  INTEGER;
            ENABLE_IMB : AIMB_REC;
            DISABLE_IMB : AIMB_REC;
            WINDOW : BOOLEAN;
            EMUL_FILE : VECTOR0_7;
            EMUL_DISC : INT;
            END;
   CONFIG_REC_PTR = ^ CONFIG_REC_TYPE;

{************************      command structure      ************************}

   CMD_REC_TYPE = INTEGER;
   CMD_REC_PTR = ^CMD_REC_TYPE;
   { ICHILDREN:SODAMO }

   CONST
       DYNAMIC_ENTRY_PTR = 48004H;
       DYNAMIC_STACK_PTR = 48008H;
       STATIC_ENTRY_PTR  = 4800CH;
       STATIC_STACK_PTR  = 48010H;
       DYNAMIC_CHANL     = 48000H;
       STATIC_CHANL      = 50000H;

       DISPLAY_ENTRY_PTR = 58000H;
       DISPLAY_STACK_PTR = 58004H;
       DISPLAY_CHANL     = 10000H;
```

```
{children's condition}
CHILD_DEAD   = 0;
CHILD_AWAKE  = 1;
CHILD_ASLEEP = 2;

{action values}
TERMINATE = -1; {child should exit}
NO_ACTION = 0;  {no action to be performed}
LOAD      = 1;  {load the hardware}
EXECUTE   = 2;  {execute the measurement}
{         = 3;  {is reserved}
HALT      = 4;  {halt the hardware}
COMPLETE  = 5;  {complete the measurement}
STOPP     = 6;  {stop the measurement}

{hardware status} { WARNING If these change, see SODA_BABY:SODABA}
NO_DATA     = -3; {Signal indicating that no data was collected}
SEMI_CATAST = -2; {Signal indicating semi-fatal hardware error}
CATASTROPHE = -1; {Signal indicating hardware error}
NO_STATUS   =  0; {Reserved}
LOADING     =  1; {Signal indicating hardware is loading}
RUNNING_RT  =  2; {Signal indicating hardware is running real-time}
RUNNING_NRT =  3; {Signal indicating hardware is running non-real-time}
HALTED      =  4; {Signal indicating hardware was halted}
COMPLETED   =  5; {Signal indicating hardware completed}
STOPPED     =  6; {Signal indicating hardware stopped}
LOADED      =  7; {Signal indicating hardware is loaded}
HALT_UNLOAD =  8; {Signal indicating hardware is halted, and unloading}
COMP_UNLOAD =  9; {Signal indicating hardware is completed, ready to unload/unloading}

TYPE
   PARAMETER_TYPE = RECORD
            ACTION          : INTEGER;     {communicate to hardware}
            CMD_STACK_PTR   : INTEGER;     {ICMD_DATA:SODAMO}
            ENA_STACK_PTR   : INTEGER;     {ICMD_DATA:SODAMO}
            DIS_STACK_PTR   : INTEGER;     {ICMD_DATA:SODAMO}
            CONFIG_PTR      : INTEGER;
            COMMAND_PTR     : INTEGER;
            END;
   PARAMETER_PTR = ^ PARAMETER_TYPE;
```

MONITOR

```
{ICDS_68K:SODAME}

   A_TOKEN_TYPE = RECORD
       APPLY : INT;
       LENGTH : INT;
       CASE CLASS : INT OF
           0, 1 : (
               VALUE : DOUBLE_WORD;
               MASK : DOUBLE_WORD;
               ATEMP : INT;
               );
           2 : (
               STRING : VECTORO_7;
               );
           3, 4 : (
               SUBCLASS : INT;
               );
           5, 7 : (
               IDENT : VECTORO_7;
               DISC : INT;
               ;
       END;
   A_TOKEN_PTR = ^ A_TOKEN_TYPE;
```

```
{ICDS_68K:SUDAMI}

REQUEST_TYPE = (
            NO_MESSAGE,                  { 0 }
            YOU_THERE,                   { 1 }
            IM_HERE,                     { 2 }
            WHO_ARE_YOU,                 { 3 }
            EMPTY,                       { 4 }
            RESPONSE,                    { 5 }
            CLOSE_REQUEST,               { 6 }
            CREATE_REQUEST,              { 7 }
            DELETE_REQUEST,              { 8 }
            OPEN_REQUEST,                { 9 }
            ADVANCE_REQUEST,             { A }
            BACKUP_REQUEST,              { B }
            POSITION_REQUEST,            { C }
            READ_REQUEST,                { D }
            READBACKWARD_REQUEST,        { E }
            READ_DCD_ADDR_REQUEST,       { F }
            WRITE_REQUEST,               { 10 }
            FILE_ERR_REQUEST,            { 11 }
            READ_REC_NUM_REQUEST,        { 12 }
            WRITEBACKWARD_REQUEST,       { 13 }
            DEFINE_IMB_REQUEST,          { 14 }
            DUMMY_1,                     { 15 }
            MESSAGE_REQUEST,             { 16 }
            READ_MEM_REQUEST,            { 17 }
            WRITE_MEM_REQUEST,           { 18 }
            LOAD_ABS_REQUEST,            { 19 }
            BREAK_REQUEST,               { 1A }
            RESET_REQUEST,               { 1B }
            RUN_REQUEST,                 { 1C }
            DUMMY_2,                     { 1D }
            DUMMY_3,                     { 1E }
            EMUL_MSG_REQUEST,            { 1F }
            DUMMY_4,                     { 20 }
            READ_REG_REQUEST,            { 21 }
            EMUL_STATUS_REQUEST,         { 22 }
            GET_SEG_REGS_REQUEST,        { 23 }
            DUMMY_5,                     { 24 }
            DUMMY_6,                     { 25 }
            G_AREA_ADDR_REQUEST,         { 26 }
            BPC_READ_REQUEST,            { 27 }
            BPC_WRITE_REQUEST,           { 28 }
            FORMATTER_REQUEST,           { 29 }
            CALENDAR_REQUEST,            { 2A }
            OUTIT_REQUEST                { 2B }
            );
CDS_TYPE = RECORD
            PANIC_FLAG : INT;
            INT_68K_HANDSHAKE : INTEGER;
            INT_BPC_HANDSHAKE : INT;
            REQUEST_TYPE : INT;
            COMMAND : INT;
            POLL_FLAG : INT;
            PARAMATERS : ARRAY[0..31] OF INT;
            IMB_REQUEST : INT;
            HARDWARE_STATUS : INT;
            END;

        { ICHILDREN:SUDANO }

        CONST
            DYNAMIC_ENTRY_PTR = 48004H;
            DYNAMIC_STACK_PTR = 48008H;
            STATIC_ENTRY_PTR  = 4800CH;
            STATIC_STACK_PTR  = 48010H;
            DYNAMIC_CHANL     = 48000H;
            STATIC_CHANL      = 50000H;

            DISPLAY_ENTRY_PTR = 58000H;
            DISPLAY_STACK_PTR = 58004H;
            DISPLAY_CHANL     = 10000H;
```

```
(children's condition)
CHILD_DEAD   = 0;
CHILD_AWAKE  = 1;
CHILD_ASLEEP = 2;

(action values)
TERMINATE = -1; (child should exit)
NO_ACTION = 0,  (no action to be performed)
LOAD      = 1;  (load the hardware)
EXECUTE   = 2;  (execute the measurement)
(         = 3;  (is reserved)
HALT      = 4;  (halt the hardware)
COMPLETE  = 5;  (complete the measurement)
STOPP     = 6;  (stop the measurement)

(hardware status) { WARNING If these change, see SODA_BABY:SODADA)
NO_DATA      = -3; (Signal indicating that no data was collected)
SEMI_CATAST  = -2; (Signal indicating semi-fatal hardware error)
CATASTROPHE  = -1; (Signal indicating hardware error)
NO_STATUS    =  0; (Reserved)
LOADING      =  1; (Signal indicating hardware is loading)
RUNNING_RT   =  2; (Signal indicating hardware is running real-time)
RUNNING_NRT  =  3; (Signal indicating hardware is running non-real-time)
HALTED       =  4; (Signal indicating hardware was halted)
COMPLETED    =  5; (Signal indicating hardware completed)
STOPPED      =  6; (Signal indicating hardware stopped)
LOADED       =  7; (Signal indicating hardware is loaded)
HALT_UNLOAD  =  8; (Signal indicating hardware is halted, and unloading)
COMP_UNLOAD  =  9; (Signal indicating hardware is completed, ready to unload/unloading)

TYPE
  PARAMETER_TYPE = RECORD
           ACTION          : INTEGER;     (communicate to hardware)
           CMD_STACK_PTR   : INTEGER;     (ICMD_DATA:SODAMO)
           ENA_STACK_PTR   : INTEGER;     (ICMD_DATA:SODAMO)
           DIS_STACK_PTR   : INTEGER;     (ICMD_DATA:SODAMO)
           CONFIG_PTR      : INTEGER;
           COMMAND_PTR     : INTEGER;
           END;
  PARAMETER_PTR = ^ PARAMETER_TYPE;

  ( ICMD_DATA:SODAMON  )

  (********************     command data stack     ********************)

  {
  | 0 .. 1 | 2 .. 3 | 4 .. 5 | 6 .. 7 | 8 .. 9 | A .. B | C .. D | E .. F |

  VAR_OP, PROC_OP, LINE_OP, FILE_OP
  ------------------------------------------------------------------------
  | OPCODE | PROC # | FILE # | DISC # |  FLAGS | STATUS | LINE 1 | LINE 2 |
  ------------------------------------------------------------------------
  | PROC_NAME  - - - - - - - - - - - - - - - - - - - - - - - - - - - ->|
  ------------------------------------------------------------------------
  | FILE_NAME  - - - - - - - - - - - - - - - - - - - - - - - - - - - ->|
  ------------------------------------------------------------------------
  |   ADDRESS     |      SIZE      | ENTRY ADDRESS  |  EXIT ADDRESS   |
  ------------------------------------------------------------------------
  |    DB PTR     | LENGTH |LANGUAGE| OFFSET | OFFSET |        |        |
  ------------------------------------------------------------------------

  STATE_OP
  ------------------------------------------------------------------------
  | OPCODE |     ADDRS      |     A MASK      |  DATA  | D MASK |  STAT  |
  ------------------------------------------------------------------------
  | S MASK |        |        |        |        |        |        |        |
  ------------------------------------------------------------------------
  |        |        |        |        |        |        |        |        |
  ------------------------------------------------------------------------
  |        |        |        |        |        |        |        |        |
  ------------------------------------------------------------------------
  |        |        |        |        |        |        |        |        |
  ------------------------------------------------------------------------
```

VALUE_OP

| OPCODE | VALUE | REL_OP | | | | | |
|---|---|---|---|---|---|---|---|
| | | | | | | | |
| | | | | | | | |
| | | | | | | | |
| | | | | | | | |

OFFSET

| OPCODE | OFFSETS. | 1 . | 2 . | 3 |
|---|---|---|---|---|
| . | 4 . | 5 . | 6 . | 7 |
| . | SIZES . | 1 . | 2 . | 3 |
| . | 4 . | 5 . | 6 . | 7 |
| . | | | | |

PARENTS

| OPCODE | PROC_NUM | 1 | 2 | 3 | | 5 | 6 |
|---|---|---|---|---|---|---|---|
| 7 | 8 | 9 | 10 | 11 | 12 | 13 | 14 |
| STACK_OF | 1 | 2 | 3 | 4 | 5 | 6 | 7 |
| 8 | 9 | 10 | 11 | 12 | 13 | 14 | |
| | | | | | | | |

LINES

| OPCODE | | ADDRS . | 1 . | 2 . |
|---|---|---|---|---|
| 3 . | | 4 . | 5 . | 6 . |
| 7 . | | 8 . | 9 . | 10 . |
| 11 . | | 12 . | 13 . | 14 . |
| 15 . | | 16 . | 17 . | 18 . |

PROCS

| OPCODE | | | ENTRY . | 1 . |
|---|---|---|---|---|
| 2 . | 3 . | | 4 . | 5 . |
| 6 . | 7 . | | 8 . | EXIT . |
| 1 . | 2 . | | 3 . | 4 . |
| 5 . | 6 . | | 7 . | 8 . |

TRACE

| VARIABLES | LAST_ACCESS | STATEMENTS | MODULES | DATA_FLOW |
|---|---|---|---|---|
| VAR_OP | VAR_OP | PARENTS | PARENTS | PARENTS |
| [OFFSET] | [OFFSET] | LINE_OP/PROC_OP | PROC_OP | PROC_OP |
| ... | ... | TR_STA | ... | VAR_OP |
| TR_VAR | TR_ASN | EOL | FILE_OP | [OFFSET] |
| EOL | EOL | | PROCS | ... |
| | | | ... | ... |
| | | | TR_MOD | TR_DAT |
| | | | EOL | EOL |

```
DISPLAY        MODIFY
VARIABLE       VARIABLE
----------     -----------
VAR_OP         VALUE
[OFFSET]       VAR_OP
DISP_VAR       [OFFSET]
EOL            MOD_VAR
               EOL

COUNT
STATEMENTS
----------
PARENTS
LINE_OP/PROC_OP
LINES
  ...
CT_STA
EOL

TIME
MODULES
-------
PARENTS
MOD_OP
  ...
TI_MOD
EOL
}

CONST
    MAX_DATA_INDEX = 34;
TYPE
    CMD_DATA_INDEX = 0..MAX_DATA_INDEX;
    CMD_INDEX_SET = SET OF CMD_DATA_INDEX;
    OP_CODES = (
                TR_VAR,       { 0 trace variables}
                TR_ASN,       { 1 trace assignment}
                TR_DAT,       { 2 trace data_flow}
                TR_MOD,       { 3 trace modules}
                TR_STA,       { 4 trace statements}
                TR_XXX,       { 5 trace don't care}
                DISP_VAR,     { 6 display variable}
                MOD_VAR,      { 7 modify variable}
                TI_MOD,       { 8 time modules}
                TI_STA,       { 9 time statements}
                CT_MOD,       { A count modules}
                CT_STA,       { B count statements}
                BRK_ON,       { C break on}
                CD_ENA,       { D measurement enable}
                CD_DIS,       { E measurement disable}
                AT_RUN,       { F emulation run}
                COMMAND,      {10 measurement command boundary:  ^ }
                VAR_OP,       {11 variable symbol}
                PROC_OP,      {12 procedure symbol}
                LINE_OP,      {13 line range symbol}
                FILE_OP,      {14 file symbol}
                SYMBOL,       {15 symbol boundary:        ,        ^ }
                STATE_OP,     {16 address/data/status/dontcare op}
                VALUE_OP,     {17 value and relational op for compares}
                OFFSET,       {18 array of record offsets}
                PARENTS,      {19 array of procedure parents}
                LINES,        {1A array of source line entry points}
                PROCS,        {1B array of module entry/exit pairs}
                FOLLOWED_BY,  {1C followed_by operand}
                EOL           {1D end_of_command_line}
                );
   CMD_DATA_TYPE = RECORD
          CASE OP_CODE : OP_CODES OF
          TR_VAR,
          TR_ASN,
          TR_DAT,
          TR_MOD,
          TR_STA,
          TR_XXX,
```

```
         DISP_VAR,
         MOD_VAR,
         TI_MOD,
         TI_STA,
         CT_MOD,
         CT_STA,
         CD_ENA,
         CD_DIS,
         BRK_ON,
         AT_RUN,
         COMMAND,
         EOL : (
              DUMMY1 : ARRAY[0..38] OF INT;
              );
         VAR_OP,
         PROC_OP,
         LINE_OP,
         FILE_OP : (
              PROC_NUM : INT; {0 if program}
              FILE_NUM : INT;
              DISC_NUM : INT;
              FLAGS : INT;    {data base flags field}
              STATUS : INT;   {B2=op_code,B1=write/exit,B0=read/entry}
              LINE1 : INT;
              LINE2 : INT;
              PROC_NAME : VECTOR0_7;
              FILE_NAME : VECTOR0_7;
              ADDRESS : INTEGER;          {both address and size are}
              SIZE : INTEGER;             {= -1 if offset array used}
              ENTRY : INTEGER;
              EXIT : INTEGER;
              DB_PTR : INTEGER;
              DB_LENGTH : INT;
              LANGUAGE : INT;
              ENTRY_OFFSET : INT;
              EXIT_OFFSET : INT;
              DUMMY2 : ARRAY[0..1] OF INT;
              );
         STATE_OP : (
              ADRS : INTEGER;
              ADRSMASK : INTEGER;
              DATA : INT;
              DATAMASK : INT;
              STAT : INT;
              STATMASK : INT;
              DUMMY3 : ARRAY[0..30] OF INT;
              );
         VALUE_OP : (
              VAL_VALUE : INTEGER;
              REL_OP : INT;   {B2=<,B1==,B0=>}
              DUMMY7 : ARRAY[0..35] OF INT;
              );
         OFFSET : (
              OFFSETS : ARRAY[0..8] OF INTEGER;
              SIZES : ARRAY[0..8] OF INTEGER;
              DUMMY4 : ARRAY[0..2] OF INT;
              );
         PARENTS : (
              PROC_NUMS : ARRAY[0..14] OF INT;
              STACK_OFFS : ARRAY[0..14] OF INT;
              DUMMY5 : ARRAY[0..8] OF INT;
              );
         LINES : (
              DUMMY6 : INT;
              ADDRS : ARRAY[0..18] OF INTEGER;
              );
        PROCS : (
             DUMMY8 : ARRAY[0..2] OF INT;
             ENTRYS : ARRAY[0..8] OF INTEGER;
             EXITS : ARRAY[0..8] OF INTEGER;
             )
             END;
CMD_DATA_PTR = ^CMD_DATA_TYPE;
```

```
    CMD_DATA_ARRAY = ARRAY [CMD_DATA_INDEX] OF CMD_DATA_TYPE;
    CMD_ARRAY_PTR = ^CMD_DATA_ARRAY;

{*********************      configuration structure      *********************}

    IMB_LINES = (NO_WAY_JOSE, TRIGGER, TRIGGER_ENABLE, STORAGE_ENABLE);

    RUN_COMMANDS = ( FROM_PC, FROM_ADRS, FROM_XFER, NO_RUN_CMD );

    AIMB_REC = RECORD
            DRIVE : IMB_LINES;
            RECEIVE : IMB_LINES;
            END;
    CONFIG_REC_TYPE = RECORD
            LENGTH : INT;   {structure length in words for file I/O}
            ADS_FILE : VECTOR0_7;
            ABS_DISC : INT;
            EMUL_ID : INT;
            COUNT_TIME : BOOLEAN;
            REAL_TIME : BOOLEAN;   {only this much goes to the disc}
            BREAK_MEAS_COMP : BOOLEAN;
            RUN_AT_EXEC :  BOOLEAN;
            RUN_CMD : RUN_COMMANDS;
            RUN_ADRS :  INTEGER;
            ENABLE_IMB : AIMB_REC;
            DISABLE_IMB : AIMB_REC;
            WINDOW : BOOLEAN;
            EMUL_FILE : VECTOR0_7;
            EMUL_DISC : INT;
            END;
    CONFIG_REC_PTR = ^ CONFIG_REC_TYPE;

{***********************      command structure      ***********************}

    CMD_REC_TYPE = INTEGER;
    CMD_REC_PTR = ^CMD_REC_TYPE;
        { ICONFIG.SODAMO }

        CONST
            Header                  = 01;
            Default_File            = 02;
            Default_Proc            = 03;
            Default_Block           = 04;
            Measurement_Type        = 05;
            Meas_Disp_Type           = 06;
            Source_File             = 07;
            Emul_Cmd_File           = 08;
            Configuration           = 15;
            Display_Master          = 16;
            Current_Formats         = 17;
            Meas_Setup              = 18;

        TYPE

            HEADER_TYPE = RECORD
                    LENGTH : INT;
                    NUMBER : INT;
                    BOARD_ID : INT;
                    PROTECTED : INT;
                    CODE_REV : INT;
                    SUDS_DATE : INTEGER;
                    END;
            HEADER_PTR = ^ HEADER_TYPE;

            TAG_TYPE = RECORD;
                    LENGTH : INT;
                    NUMBER : INT;
                    SUB_NUM : INT;
                    END;
            TAG_PTR = ^ TAG_TYPE;

            BOOLEAN_TYPE = RECORD
                    LENGTH : INT;
                    NUMBER : INT;
```

```
          VALUE : BOOLEAN;
          END;
BOOLEAN_PTR = ^ BOOLEAN_TYPE;

INT_TYPE = RECORD
          LENGTH : INT;
          NUMBER : INT;
          VALUE : INT;
          END;
INT_PTR = ^ INT_TYPE;

INTEGER_TYPE = RECORD
          LENGTH : INT;
          NUMBER : INT;
          VALUE : INTEGER;
          END;
INTEGER_PTR = ^ INTEGER_TYPE;

VECTOR_TYPE = RECORD
          LENGTH : INT;
          NUMBER : INT;
          VALUE : VECTOR0_7;
          END;
VECTOR_PTR = ^ VECTOR_TYPE;

FILE_TYPE = RECORD
          LENGTH : INT;
          NUMBER : INT;
          FILE_NAME : VECTOR0_7;
          FILE_DISC : INT;
          END;
FILE_PTR = ^ FILE_TYPE;

CONFIG_TYPE = RECORD
          LENGTH : INT;
          NUMBER : INT;
          VALUE : CONFIG_REC_TYPE;        {ICMD_DATA}
          END;
CONFIG_PTR = ^ CONFIG_TYPE;

DISP_SPEC_TYPE = RECORD
          LENGTH : INT;
          NUMBER : INT;
          VALUE : DISPLAY_SPEC;           {INCLUDE:KIP}
          END;
DISP_SPEC_PTR = ^ DISP_SPEC_TYPE;

FORMAT_TYPE = RECORD
          LENGTH : INT;
          NUMBER : INT;
          VALUE : INT;
          FORMAT : FMT;                   {INCLUDE:KIP}
          END;
FORMAT_PTR = ^ FORMAT_TYPE;

CONFIGURE_PTR = RECORD
          CASE INT OF
         -2  : (REC         : PTR);
         -1  : (GENERIC     : INTEGER);
          0  : (HEADER      : HEADER_PTR);
          1  : (A_TAG       : TAG_PTR);
          2  : (A_BOOLEAN   : BOOLEAN_PTR);
          3  : (A_INT       : INT_PTR);
          4  : (A_INTEGER   : INTEGER_PTR);
          5  : (A_VECTOR    : VECTOR_PTR);
          6  : (A_FILE      : FILE_PTR);
          10 : (A_CONFIG    : CONFIG_PTR);
          11 : (A_DISPLAY   : DISP_SPEC_PTR);
          12 : (A_FORMAT    : FORMAT_PTR);
          END;
```

```
{ IDATA_BASE:SODANO}

PROG_TYPE = RECORD                          {record type 99}
            NODE_SIZE : INT;
            NODE_PTR : INT;
            ID : BYTE;
            DISC : BYTE;
            LANGUAGE : INT;
            PROG_LOAD : INTEGER;
            MIN_STATIC : INTEGER;
            MAX_STATIC : INTEGER;
            ENTRY : INTEGER;
            EXIT : INTEGER;
            SOURCE : VECTORO_7;
            PROGRA : VECTORO_7;
            END;
PROG_PTR = ^ PROG_TYPE;

PROC_TYPE = RECORD                          {record type 0}
            LEVEL : BYTE;
            REC_TYPE : BYTE;
            FLAGS : INT;
            NUMBER : INT;
            PARM_PTR : INT;
            TYPE_PTR : INT;
            VAR_PTR : INT;
            ENTRY : INTEGER;
            EXIT : INTEGER;
            E_LABEL : INTEGER;
            SIZE : INT;
            STATIC : INT;
            ENTRY_OFFSET : INT;
            EXIT_OFFSET : INT;
            END;
PROC_PTR = ^ PROC_TYPE;

FUNC_TYPE = PROC_TYPE;                      {record type 1}
            {same as PROC_TYPE}
FUNC_PTR = ^ FUNC_TYPE;

VARIABLE_TYPE = RECORD                      {record type 2}
            REC_SIZE : BYTE;
            REC_TYPE : BYTE;
            FLAGS : INT;
            PARM_PTR : INT; {only used in paramater}
            ADDRESS : INTEGER;
            TYPE_PTR : INT;
            NEXT_PTR : INT;
            SIZE : INTEGER;
            NAME : VECTORO_7;
            END;
VARIABLE_PTR = ^ VARIABLE_TYPE;

REC_FIELD_TYPE = RECORD                     {record type 3}
            REC_SIZE : BYTE;
            REC_TYPE : BYTE;
            OFFSET : INTEGER;
            NEXT_PTR : INT;
            TYPE_PTR : INT;
            NAME : VECTORO_7;
            END;
REC_FIELD_PTR = ^ REC_FIELD_TYPE;

IMM_CONST_TYPE = VARIABLE_TYPE;             {record type 4}
            {same as VARIABLE}
IMM_CONST_PTR = ^ IMM_CONST_TYPE;

STR_CONST_TYPE = VARIABLE_TYPE;             {record type 5}
            {same as VARIABLE}
STR_CONST_PTR = ^ STR_CONST_TYPE;

PARAMATER_TYPE = VARIABLE_TYPE;             {record type 6}
            {same as VARIABLE}
PARAMATER_PTR = ^ PARAMATER_TYPE;
```

```
SCALAR_TYPE = RECORD                    {record type 7}
          DUMMY : BYTE;
          REC_TYPE : BYTE;
          SIZE : INT;
          REC_SIZE : INT;
          SCALAR : ARRAY [0..1] OF RECORD {undefined number}
                        VALUE : INTEGER;
                        NAME : VECTORO_7;
                        END;
          END;
SCALAR_PTR = ^ SCALAR_TYPE;

SUBRANGE_TYPE = RECORD                  {record type 8}
          SIGNED : BYTE;
          REC_TYPE : BYTE;
          SIZE : INT;
          TYPE_PTR : INT;
          MIN : INTEGER;
          MAX : INTEGER;
          END;
SUBRANGE_PTR = ^ SUBRANGE_TYPE;

POINTER_TYPE = RECORD                   {record type 9}
          DUMMY : BYTE;
          REC_TYPE : BYTE;
          SIZE : INT;
          TYPE_PTR : INT;
          END;
POINTER_PTR = ^ POINTER_TYPE;

A_SET_TYPE = POINTER_TYPE;              {record type 10}
          {same as POINTER_TYPE}
A_SET_PTR = ^ A_SET_TYPE;

AN_ARRAY_TYPE = RECORD                  {record type 11}
          DUMMY : BYTE;
          REC_TYPE : BYTE;
          SIZE : INT;
          UNUSED : INT;
          TYPE_PTR : INT;
          INDEX_PTR : INT;
          LOWER : INTEGER;
          UPPER : INTEGER;
          END;
AN_ARRAY_PTR = ^ AN_ARRAY_TYPE;

A_RECORD_TYPE = RECORD                  {record type 12}
          DUMMY : BYTE;
          REC_TYPE : BYTE;
          SIZE : INT;
          UNUSED : INT;
          FIELD_PTR : INT;
          END;
A_RECORD_PTR = ^ A_RECORD_TYPE;

TAG_TYPE = RECORD                       {record type 13}
          DUMMY : BYTE;
          REC_TYPE : BYTE;
          OFFSET : INTEGER;
          NEXT_PTR : INT;
          VARIANT_PTR : INT;
          TAG_FLAG : INT;
          SEL_FLAG : INT;
          SEL_VALUE : INT;
          END;
TAG_PTR = ^ TAG_TYPE;

VARIANT_TYPE = RECORD                   {record type 14}
          DUMMY : BYTE;
          REC_TYPE : BYTE;
          UNUSED : INT;
          SELECT : INT;
          FIELD_PTR · INT,
```

```
          VARIANT_PTR : INT;
          END;
VARIANT_PTR = ^ VARIANT_TYPE;

EXT_PROC_TYPE = RECORD                    {record type 15}
          DUMMY : BYTE;
          REC_TYPE : BYTE;
          TYPE_PTR : INT;
          NUMBER : INT;
          PARMS_PTR : INT;
          NEXT_PTR : INT;
          NAME : VECTOR0_7;
          END;
EXT_PROC_PTR = ^ EXT_PROC_TYPE;

REAL_TYPE = RECORD                        {record type 16}
          DUMMY : BYTE;
          REC_TYPE : BYTE;
          SIZE : INT;
          END;
REAL_PTR = ^ REAL_TYPE;

A_CHAR_TYPE = REAL_TYPE;                  {record type 17}
          {same as REAL_TYPE}
A_CHAR_PTR = ^ A_CHAR_TYPE;

AN_INTEGER_TYPE = REAL_TYPE;              {record type 18}
          {same as REAL_TYPE}
AN_INTEGER_PTR = ^ AN_INTEGER_TYPE;

A_BIT_FIELD_TYPE = RECORD                 {record type 19}
          DUMMY : BYTE;
          REC_TYPE : BYTE;
          SIZE : INT;
          BITS : INT;
          FIRST_BIT : INT;
          END;
A_BIT_FIELD_PTR = ^ A_BIT_FIELD_TYPE;
A_RETURN_TYPE = RECORD                    {record type 20}
          DUMMY : BYTE;
          REC_TYPE : BYTE;
          TYPE_PTR : INT;
          END;
A_RETURN_PTR = ^ A_RETURN_TYPE;
A_FILE_TYPE = RECORD                      {record type 21}
          END;
A_FILE_PTR = ^ A_FILE_TYPE;
GENERIC_PTR = RECORD
          CASE INT OF
         -1 : (GENERIC    : INTEGER);
         99 : (PROG       : PROG_PTR);
          0 : (PROC       : PROC_PTR);
          1 : (FUNC       : FUNC_PTR);
          2 : (VARIABLE   : VARIABLE_PTR);
          3 : (REC_FIELD  : REC_FIELD_PTR);
          4 : (IMM_CONST  : IMM_CONST_PTR);
          5 : (STR_CONST  : STR_CONST_PTR);
          6 : (PARAMATER  : PARAMATER_PTR);
          7 : (SCALAR     : SCALAR_PTR);
          8 : (SUBRANGE   : SUBRANGE_PTR);
          9 : (POINTER    : POINTER_PTR);
         10 : (A_SET      : A_SET_PTR);
         11 : (AN_ARRAY   : AN_ARRAY_PTR);
         12 : (A_RECORD   : A_RECORD_PTR);
         13 : (TAG        : TAG_PTR);
         14 : (VARIANT    : VARIANT_PTR);
         15 : (EXT_PROC   : EXT_PROC_PTR);
         16 : (REAL       : REAL_PTR);
         17 : (A_CHAR     : A_CHAR_PTR);
         18 : (AN_INTEGER : AN_INTEGER_PTR);
         19 : (BIT_FIELD  : A_BIT_FIELD_PTR);
         20 : (RETURN     : A_RETURN_PTR);
         21 : (A_FILE     : A_FILE_PTR);
         END;
```

```
{ IDISPLAY:SODAMO }

CONST
    SCREEN_START = 0FA18H;
    SCREEN_LENGTH = 720;
    SCREEN_SIZE = 16;
    LINE_SIZE = 79;
    SOURCE_SIZE = 131;
    COMMAND_SIZE = 237;

    Current      = -1;
    Display      = 0;
    Setup        = 1;
    Measurement  = 2;
    Source       = 3;
    Debug        = 4;
    Symbol       = 5;

    All = 0;
    Execution = 1;
{   Measurement = 2;  }
    Enable = 3;
    Disable = 4;
    Command_stack = 1;
    Spec_stack = 2;

TYPE
    BVECTOR0_5 = ARRAY[0..5] OF BYTE;
    LINE_BUFFER = ARRAY[-2..LINE_SIZE] OF BYTE;
    LINE_BUFFER_PTR = ^ LINE_BUFFER;
    SCREEN_BUFFER = ARRAY[-1..SCREEN_SIZE] OF ARRAY[0..LINE_SIZE] OF BYTE;
    SCREEN_BUFFER_PTR = ^ SCREEN_BUFFER;
    SOURCE_LINE = ARRAY[-2..SOURCE_SIZE] OF BYTE;
    SOURCE_LINE_PTR = ^ SOURCE_LINE;
    COMMAND_LINE = ARRAY[-2..COMMAND_SIZE] OF BYTE;
    COMMAND_LINE_PTR = ^ COMMAND_LINE;
    BUFFER_TYPE = RECORD
                REC_NO : INT;
                LINE_NO : BVECTOR0_5;
                LINE : SOURCE_LINE_PTR;
                END;
    BUFFER_ARRAY_TYPE = ARRAY[1..SCREEN_SIZE] OF BUFFER_TYPE;
    DISPLAY_TYPE = RECORD
                LINE : LINE_BUFFER_PTR;         {buffer for a line}
                UNDER : LINE_BUFFER_PTR;        {buffer for copying enhanced lines}
                SCREEN : SCREEN_BUFFER_PTR;     {buffer for screen}
                HEADER : LINE_BUFFER_PTR;       {buffer for header info from BPC}
                COMMAND : INT;                  {display command}
                COLUMN : INT;                   {current line column}
                ROW : INT;                      {current row number}
                MAX_LINE : INT;                 {maximum number of lines}
                HORIZONTAL : INT;               {first row of display}
                VERTICAL : INT;                 {first column of display}
                POSITION : INT;                 {position value}
                LAST_DISPLAY : INT;             {the last thing displayed}
                COPY_FLAG : BOOLEAN;            {this is a copy command}
                HOLD_DISPLAY : BOOLEAN;         {hold, do not update display}
                END;
    DEBUG_TYPE = RECORD
                COMMAND : INT;
                STACK : INT;

    END;

        {IG_AREA:SODARUN}

        CONST
            BLANK_SOFT_OFF= -12;
            EMUL_FILE_OFF = -10;
            EMUL_DISC_OFF =  -2;
            EMUL_ID_OFF   =   2;
            ABS_FILE_OFF  =  15;
            ABS_DISC_OFF  =  23;
            REAL_TIME_OFF = 150;
```

```
TYPE
   NAME = ARRAY [0..7] OF INTEGER;
   CTL_RST = ARRAY[0..47] OF INTEGER;
   CTL_PRC = ARRAY[0..7] OF INTEGER ;
   CTL_RW  = ARRAY[0..15] OF INTEGER ;
   MAP_ENTRY = ARRAY[0..2] OF INTEGER;
   MAP_ARRAY_TYPE = ARRAY[0..31] OF MAP_ENTRY;
   MAP = RECORD
        LENGTH : INTEGER;
        MAP_ARRAY : MAP_ARRAY_TYPE;
        END;
   BREAK_ENTRY = RECORD
        ADDR : DOUBLE_WORD;
        CODE : INTEGER;
        STATUS : INTEGER;
        END; {record break_entry}
   SUBK_REC_TYPE = RECORD
        {list of 16 addresses of su/brkpts followed by removed byte of code}
        ADDR_LIST : ARRAY[1..16]OF BREAK_ENTRY;
        NUM_ENTRIES : INTEGER;  {number of entries in subk_list}
        PENDING : INTEGER; {count of pending breakpoints set}
        END;  {record subk_rec_type}
   GLOBAL_AREA_TYPE = RECORD
          FIRST_RECORD_LENGTH          : INTEGER;
              EMUL_SLOT_NUM            : INTEGER;
              EMUL_ID                  : INTEGER;
              MEM_SLOT_NUM             : INTEGER;
              MEM_ID                   : INTEGER;
              ANAL_SLOT_NUM            : INTEGER;
              ANAL_ID                  : INTEGER;
              END_EMUL_FLAG            : BOOLEAN;
              ADDRESS_BASE             : INTEGER;
              WORD_SIZE                : INTEGER;
              PROCESSOR_ADDRESS_MASK : DOUBLE_WORD;
              NUM_ADDR_BITS            : INTEGER;
              NUM_OPC_BITS             : INTEGER;
              BYTE_SWAP_FLAG           : BOOLEAN;
              LOAD_FILE                : VECTORO_7;
              LOAD_DISC                : INTEGER;
              INV_ASSEM_FILE           : VECTORO_7;
              INV_ASSEM_DISC           : INTEGER;
              XFR_ADDR_FLAG            : BOOLEAN;
              XFR_ADDR                 : DOUBLE_WORD;
              MODE_WORD                : INTEGER;
          SECOND_RECORD_LENGTH         : INTEGER;
              MEM_ACC_MODE             : INTEGER;          {0=HALT_ONLY,1=HALT OR WINDOW}
              MEM_CTL_WORD             : INTEGER;
              MAP_ADDR_MASK            : DOUBLE_WORD;
              MAP_DEFAULT              : INTEGER;
              NUM_MEMORY_BLOCKS        : INTEGER;
              MEMORY_BLOCK_SIZE        : INTE(         {0=256,1=4K,2=1K}
              MEMORY_MAP               : MAP;
              SPECIAL_USER             : BOOLEAN;     {8-bit ,TRUE if in special area}
              ROM_TYPE                 : INTEGER; { ROM probe stuff }
              ROM_NUMBER               : INTEGER; { ROM probe stuff }
              ALTERNATE_TABLE          : BOOLEAN;
          THIRD_RECORD_LENGTH          : INTEGER;
              EMUL_MODE                : INTEGER;
              EMUL_CTL                 : INTEGER;
              LAST_CONTROL             : INTEGER;
              REAL_TIME_ONLY           : BOOLEAN; {0=NO, 1=YES}
              MONITOR_LOAD             : BOOLEAN;
              ADR_MONITOR_C            : DOUBLE_WORD;
              ADR_REGISTER             : DOUBLE_WORD;
              ADR_XFR_BUF              : DOUBLE_WORD;
              MSG_LDR                  : INTEGER;
              MSG_EMUL                 : INTEGER;
              MSG_MONITOR              : INTEGER;
              MSG_ERR                  : INTEGER;
              RST_PRC_CONT             : CTL_RST; {Restart processor control words(max.48) }
              RUN_PRC_CONT             : CTL_PRC; {Run processor control words(max.8) }
              BREAK_PRC_CONT           : CTL_PRC; {Break prc. control words(max.8) }
              SETRW_PRC_CONT           : CTL_RW; {Set read/write prc. control(max.8) }
              TRACE_INTERACTIVE        : INTEGER;
```

```
          TRACE_STATUS           : INTEGER;
          TRACE_DISP_STATUS      : INTEGER;
          TRACE_SPEC_STATUS      : INTEGER;
          TRACE_FILE             : INTEGER;
          T_ADDR_BITS            : INTEGER;
          T_ADDR_MASK            : INTEGER;
          T_ADDR_COMP            : INTEGER;
          INTERNAL_TRIG          : BOOLEAN;
          T_STATUS_BITS          : INTEGER;
          T_STATUS_MASK          : INTEGER;
          T_RANGE_MASK           : INTEGER;
          INTERACTIVE_ON         : BOOLEAN;
          STEP_STATUS            : INTEGER;
          OFFSET_VALUE           : BOOLEAN;
          LOAD_TYPE              : INTEGER;
          LIST_DEST              : INTEGER;
          STEP_NUM               : INTEGER;
          ADR_PRC_MSG            : DOUBLE_WORD;  {Address of MONITOR_MESSAGE . }
          ANALYSIS_BREAK         : BOOLEAN;
       FOURTH_RECORD_LENGTH      : INTEGER;
          SIM_IO_FLAG            : INTEGER;
          DISPLAY_FLAG           : INTEGER;
          PRINTER_FLAG           : INTEGER;
          RS232_FLAG             : INTEGER;
          KEYBD_FLAG             : INTEGER;
          DISC_FILES_FLAG        : INTEGER;
          DISPLAY_CONTROL        : DOUBLE_WORD;
          PRINTER_CONTROL        : DOUBLE_WORD;
          RS232_CONTROL          : DOUBLE_WORD;
          KEYBD_CONTROL          : DOUBLE_WORD;
          SIM_IO_FILE_1          : NAME;
          SIM_IO_DISC_1          : INTEGER;
          SIM_IO_CTL_1           : DOUBLE_WORD;
          SIM_IO_DCB_1           : INTEGER;
          SIM_IO_FILE_2          : NAME;
          SIM_IO_DISC_2          : INTEGER;
          SIM_IO_CTL_2           : DOUBLE_WORD;
          SIM_IO_DCB_2           : INTEGER;
          SIM_IO_FILE_3          : NAME;
          SIM_IO_DISC_3          : INTEL
          SIM_IO_CTL_3           : DOUBLE_WORD;
          SIM_IO_DCB_3           : INTEGER;
          SIM_IO_FILE_4          : NAME;
          SIM_IO_DISC_4          : INTEGER;
          SIM_IO_CTL_4           : DOUBLE_WORD;
          SIM_IO_DCB_4           : INTEGER;
          SIM_IO_FILE_5          : NAME;
          SIM_IO_DISC_5          : INTEGER;
          SIM_IO_CTL_5           : DOUBLE_WORD;
          SIM_IO_DCB_5           : INTEGER;
          SIM_IO_FILE_6          : NAME;
          SIM_IO_DISC_6          : INTEGER;
          SIM_IO_CTL_6           : DOUBLE_WORD;
          SIM_IO_DCB_6           : INTEGER;
          SPARE4_0               : INTEGER;
          SPARE4_1               : INTEGER;
          SPARE4_2               : INTEGER;
          SPARE4_3               : INTEGER;
       FIFTH_RECORD_LENGTH       : INTEGER;
          SWDK_REC               : SWDK_REC_TYPE;
          SPARE5_0               : INTEGER;
          SPARE5_1               : INTEGER;
          SPARE5_2               : INTEGER;
          SPARE5_3               : INTEGER;
          SPARE5_4               : INTEGER;
          SPARE5_5               : INTEGER;
          SPARE5_6               : INTEGER;
          SPARE5_7               : INTEGER;
       SIXTH_RECORD_LENGTH       : INTEGER;
          END;
GLOBAL_AREA_PTR = ^ GLOBAL_AREA_TYPE;
```

```
{IOS_68K:SODAME}

   OS_TYPE = ARRAY[0..19] OF RECORD
              P_ADDR : INTEGER;
              P_TIME : INTEGER;
              P_CPU : INTEGER;
              P_ID : INT;
              P_PID : INT;
              STAT_PRI : INT;
              P_SIG : INTEGER;
              P_WCHAN : INTEGER;
              DUMMY : INT;
              DDUMMY : INTEGER;
              END;
$LIST OFFS (*#INCLUDE INCLUDE:NJF*)
{*****************************************************************}
{********** INCLUDE file for display driver ***********************}
{*****************************************************************}
(* All communication between the monitor and the display driver is    *)
(* through the a DISPLAY_SPEC record.                                 *)
(* The monitor is responsible for allocating and maintaing the        *)
(* DISPLAY_SPEC record. A pointer to the DISPLAY_SPEC record will be  *)
(* passed to the the display software.                                *)
{*****************************************************************}
(* DEFAULT_FORMAT and CURRENT_FORMAT will be initialized at load time *)
(* to point to two separate but identical DISPLAY_FMT arrays.         *)
(* The display software will always display using CURRENT_FORMAT and  *)
(* will never access DEFAULT_FORMAT.                                  *)
(* IDENT=TERMINAT terminates the list of FIELDs in FMT array.         *)
{*****************************************************************}
CONST
{********** COMMAND VALUES**********}
BASE              = -9; (*Change display base*)
POSITION          = -8; (*Position to a location,  use LOCATION field in DISPLAY_SPEC*)
COPY              = -7; (*Copy measurment to file, use LOCATION field in DISPLAY_SPEC to define boundry. *)
UNUSED            = -6;
COPYALL           = -5; (*Copy all of measurment to file. *)
LEFT_JUSTIFY      = -4;
REFORMAT          = -3;
NO_SLEEP          = -2; {do not call sleep after being forked}
KILL              = -1; {child should exit (Brett calls this TERMINATE)}
NO_OP             =  0; {no action to be performed (Brett calls NO_ACTION)}
TAB               =  9;
DOWN_ARROW        = 10;
UP_ARROW          = 11;
NEXT_PAGE         = 12;
CARRAGE_RETURN    = 13;
SHIFT_TAB         = 17;
PREVIOUS_PAGE     = 18;
ROLL_DOWN         = 19;
ROLL_UP           = 20;
SHIFT_RIGHT_ARROW = 21;
SHIFT_LEFT_ARROW  = 22;

{********** IDENT   VALUES**********}
SYMBOL_FIELD      =  0;
VALUE_FIELD       =  1;
STATUS_FIELD      =  2;
KC9A_FIELD_ABS    =  3;
KC9A_FIELD_REL    =  4;
KC9A_FIELD_TIME   =  5;
SOURCE_FIELD      =  6;
SYMBOLPATH_FIELD  =  7;
SOURCEPATH_FIELD  =  8;
TERMINAT          = 10;
{********** BASE    VALUES**********}
ASCII             =  0;
BIN               =  1;
OCT               =  2;
DEC               =  3;
HEX               =  4;
REAL              =  5;
DEFAULT           =  6;
TYPE
```

```
FIELD          = RECORD
  IDENT        : INT;                (*FIELD IDENTIFIER*)
  WIDTH        : INT;                (*# OF CHARACTES TO BE DISPLAYED*)
  END;
FMT            = ARRAY[0..9] OF FIELD; (*DEFINES FIELDS AND ORDER FOR DISPLAYING A MEASUREMEND*)
FMT_PTR        = ^FMT;
VALID_ARRAY    = ARRAY[0..7] OF INT;   (*NUMBER OF POSSIBLE TYPES OF FIELDS, ie IDENTs*)
VALID_PTR      = ^VALID_ARRAY;

(*****************************************************************************)
(* DISPLAY_SPEC handles all communtication betuen monitor and display driver *)
(*****************************************************************************)
DISPLAY_SPEC     = RECORD
  BPCDUMMY       : INT;          (*Dummy word to fix BPC indirects when accessing first field*)
  CMD            : INT;          (*Instruction from monitor to display driver*)
  DEFAULT_FORMAT : FMT_PTR;      (*Pt to default format for current type of measurement*)
  CURRENT_FORMAT : FMT_PTR;      (*Pt to current format for current type of measurement*)
  LISTFILE_NAME  : FMGRNAME;     (*Listfile name*)
  LISTFILE_DISC  : INT;          (*Listfile disc*)
  APPEND         : BOOLEAN;      (*TRUE==> append to listfile FALSE==> do not append to list file*)
  DUMMY          : BOOLEAN;      (*Pad byte to avoid 509 errors in 68000*)
  LOCATION       : INT;          (*acq memory location reletive to trigger location.*)
  BASE           : INT;          (*Defines base*)
  VARIANT        : INT;          (*will define which variant to display, currently not well understood*)
  END;
DISPLAY_SPEC_PTR  =^DISPLAY_SPEC;
$LIST ON$
{ ISPEC_DATA SOUAMON }

{********************    data base symbols    ********************}

CONST
   SYMBUFF_SIZE = 4095;
   MAX_SYM_SIZE = 1024;
   SMALL_SYMBUFF_SIZE = 1023;
TYPE
   SYMBUFF_TYPE = ARRAY [0..SYMBUFF_SIZE] OF INT;
   SYMBUFF_PTR = ^ SYMBUFF_TYPE;
   SMALL_SYMBUFF_TYPE = ARRAY [0..SMALL_SYMBUFF_SIZE] OF INT;
   SMALL_SYMBUFF_PTR = ^ SMALL_SYMBUFF_TYPE;
   PATH_TYPE = RECORD
              SYM      : VECTOR0_7;
              PROC_NUM : INT;
              PROG_NUM : INT;
              END;
   PATH_PTR = ^ PATH_TYPE;
   SYMSET = (Prog, Proc, Func, Vari, Cons, Parm, Exts);
   SYM_DESC_TYPE = RECORD
              SYMBOL_NAME : VECTOR0_7;
              SYMBOL_TYPE : SYMSET;
              SYMBOL_DATA : SYMBUFF_PTR;
              PROC_NAME   : VECTOR0_7;
              PROC_NUM    : INT;
              FILE_NAME   : VECTOR0_7;
              FILE_DISC   : INT;
              FILE_NUM    : INT;
              LANGUAGE    : INT;
              FLAG        : BOOLEAN;
              END;
   SYM_DESC_PTR = ^ SYM_DESC_TYPE;

{********************   spec and variable stacks   ********************}

CONST
   SPECABLE_SIZE = 363;

   SPEC_ADDRESS = 12;        {address}
   SPEC_OPERAND = 11;        {coded operand}
   SPEC_FILE    = 10;        {path_file_name}
   SPEC_PROC    =  9;        {path_proc_name}
   SPEC_DXVAL   =  8;        {dont_care value}
   SPEC_VALUE   =  7;        {value}
   SPEC_SYMBOL  =  6;        {symbol}
   SPEC_MODULE  =  5;        {module}
   SPEC_LINE    =  4;        {line}
```

```
    SPEC_IDENT   =  3;          {identifier}
    SPEC_SCALAR  =  2;          {scalar index}
    SPEC_INDEX   =  1;          {numeric index}
    SPEC_PTR     =  0;          {^, ->, *}
    SPEC_END     = -1;          {end of spec stack}
    SPEC_VEND    = -2;          {end of variable sub-stack}

    SPEC_OP_RE = 100;           {read}
    SPEC_OP_WR = 101;           {write}
    SPEC_OP_RW = 102;           {read_write}
    SPEC_OP_EN = 103;           {entry}
    SPEC_OP_EX = 104;           {exit}
    SPEC_OP_EE = 105;           {entry_exit}
    SPEC_OP_EQ = 110;           {=}
    SPEC_OP_NE = 111;           {<>}
    SPEC_OP_LT = 112;           {<}
    SPEC_OP_GT = 113;           {>}
    SPEC_OP_LE = 114;           {<=}
    SPEC_OP_GE = 115;           {>=}
    SPEC_OP_UP = 116;           {^}
    SPEC_OP_PO = 117;           {->}
    SPEC_OP_ST = 118;           {*}
    SPEC_OP_FS = 119;           {* (only for display purposes)}
    SPEC_OP_PC = 120;           {program_counter}
    SPEC_OP_TA = 121;           {transfer_address}
    SPEC_OP_LA = 122;           {last_access}
    SPEC_OP_OFF= 123;           {off}
    SPEC_OP_ANY= 124;           {any_state}
    SPEC_OP_ALL= 125;           {all}
    SPEC_OP_BY = 126;           {followed_by}
    SPEC_OP_OR = 127;           {or}
    SPEC_OP_DP = 128;           {default path used}
TYPE
    SPECABLE_ARRAY = ARRAY [0..SPECABLE_SIZE] OF INT;
    SPECABLE_ARRAY_PTR = ^ SPECABLE_ARRAY;
    SPECABLE_TYPE = RECORD
         OP_CODE : INT;
         LENGTH : INT;
         CASE INT OF
              SPEC_OPERAND,
              SPEC_PTR,
              SPEC_END,
              SPEC_VEND : (
                   OPERAND : INT;
                   );
              SPEC_FILE,
              SPEC_PROC,
              SPEC_MODULE,
              SPEC_SYMBOL,
              SPEC_IDENT,
              SPEC_SCALAR : (
                   IDENT  : VECTOR0_7;
                   DISC   : INT;
                   );
              SPEC_ADDRESS,
              SPEC_DXVAL,
              SPEC_VALUE,
              SPEC_LINE,
              SPEC_INDEX : (
                   VALUE : INTEGER;
                   BASE  : INT;
                   MASK  : INTEGER;
                   )
         END;
    SPECABLE_TYPE_PTR = ^ SPECABLE_TYPE;

{********************        command structure        ********************}
CONST
    NUM_OF_CMD_TYPES = 3;
TYPE
    CMD_TYPES = (EXECUTION,MEASUREMENT,START_ON,STOP_ON);
    CMD_RECORD_TYPE = RECORD
              CMD  : CMD_ARRAY_PTR;
              SPEC : SPECABLE_ARRAY_PTR;
              MARK : PTR;
```

```
            END;
    CMD_ARRAY = ARRAY[CMD_TYPES] OF CMD_RECORD_TYPE;
    FLAG_ARRAY = ARRAY[CMD_TYPES] OF BOOLEAN;

(**********************          message codes          ********************)

TYPE
    MESSAGE_TYPES = (Status,Warning,Error);

00000000  1  "68000" PREPROCESS
00000000  1  $BASE_PAGE$
00000000  1  $WIDTH 120$
00000000  1
00000000  1  PROGRAM APPLY_;
00000000  1
00000000  1  $EXTENSIONS ON$
00000000  1  $LIB_ABS_LONG$
00000000  1  $WARN OFF$
00000000  1
00000000  1  CONST
00000000  1      ERROR_CODE = 0E000H;
00000000  1
00000000  1  TYPE
00000000  1      INT = SIGNED_16;
00000000  1      PTR = ^ INTEGER;
00000000  1      VECTOR0_7 = ARRAY[0..7] OF INT;
00000000  1      DOUBLE_WORD = RECORD
00000000  2                  LSW : INT;
00000000  2                  MSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE IAPPLY_68K:SODANE
00000000  1
00000000  1  VAR
00000000  1  $EXTVAR+$
00000000  1  $FAR$
00000000  1      SYNT_ERRS : ARRAY[0..100] OF PTR;
00000000  1  $BASE_PAGE$
00000000  1      APPLY_STACK : A_TOKEN_PTR;
00000000  1      SEMANTIC_ERROR : INT;
00000000  1  $EXTVAR-$
00000000  1
00000000  1  $CALL_ABS_LONG ON$
00000000  1  PROCEDURE BPC_WRITE(ADDR_68K : INTEGER; ADDR_BPC : INT; LENGTH : INT); EXTERNAL;
00000000  1  PROCEDURE P_MESSAGE(ERROR_PTR : INTEGER; CODE : INT); EXTERNAL;
00000000  1  PROCEDURE OUTIT(LETTER : CHAR; VALUE : INT; BASE : CHAR); EXTERNAL;
00000000  1  $CALL_PC_SHORT ON$
00000000  1  PROCEDURE SEMANTIC_APPLY(STATE:INT); EXTERNAL;
00000000  1  PROCEDURE REAL_APPLY(STATE:INT); EXTERNAL;
00000000  1
00000000  1  $GLOBPROC+$
00000000  1
00000000  1  PROCEDURE APPLY(REAL : BOOLEAN);
00000000  2  VAR
00000000  2      ERROR_PTR : INTEGER;
00000004  2      TEMP : INT;
00000004  2  BEGIN
00000004  2  APPLY_STACK := A_TOKEN_PTR(1010H);
0000000C  2  WHILE (APPLY_STACK^.APPLY >= 0) AND (SEMANTIC_ERROR = 0) DO
00000028  2      BEGIN
00000028  2      IF REAL THEN
00000030  2          REAL_APPLY(APPLY_STACK^.APPLY)
0000003C  2      ELSE
0000003C  2          SEMANTIC_APPLY(APPLY_STACK^.APPLY);
00000049  2      APPLY_STACK := A_TOKEN_PTR(INTEGER(APPLY_STACK) + (APPLY_STACK^.LENGTH * 2));
0000005E  2      END;
00000060  2  IF NOT REAL THEN
00000068  2      IF SEMANTIC_ERROR <> 0 THEN
00000070  2          BEGIN
00000070  2          IF (SEMANTIC_ERROR > 0) AND (SEMANTIC_ERROR <= 70) THEN
0000008E  2              ERROR_PTR := SYNT_ERRS[SEMANTIC_ERROR]^
000000A2  2          ELSE
```

```
00000082  2                 BEGIN
000000A2  2                 ERROR_PTR := SYNT_ERRS[0]^;
000000AC  2                 END;
000000AC  2             IF SEMANTIC_ERROR <> -1 THEN
000000B8  2                 P_MESSAGE(ERROR_PTR,ERROR_CODE);
000000C8  2             {set BPC SYSTEM_ERROR := 1 to stop command files}
000000C8  2             TEMP := 1;
000000CE  2             BPC_WRITE(INTEGER(ADDR(TEMP)),0F0F6H,1); { SYSTEM_ERROR := 1; }
000000F4  2             END;
000000E4  2  END;
00000000  1  .
```

End of compilation, number of errors=    0
FILE: APPLY_SM:SODAMO    HP 64000 - Pascal    64000 Compiler

```
00000000  1  "68000" PREPROCESS
00000000  1  $BASE_PAGE$
00000000  1  $WIDTH 120$
00000000  1
00000000  1  PROGRAM SEMANTIC_APPLY_;
00000000  1
00000000  1  $EXTENSIONS ON$
00000000  1  $LIB_ABS_LONG$
00000000  1  $WARN OFF$
00000000  1
00000000  1  TYPE
00000000  1      INT = SIGNED_16;
00000000  1      PTR = ^ INTEGER;
00000000  1      VECTOR0_7 = ARRAY[0..7] OF INT;
00000000  1      FMGRNAME = ARRAY[0..7] OF INT;
00000000  1      DOUBLE_WORD = RECORD
00000000  2                  MSW : INT;
00000000  2                  LSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE IAPPLY_68K:SODAMES
00000000  1  #INCLUDE ICMD_DATA:SODAMON
00000000  1  #INCLUDE ISPEC_DATA:SODAMON
00000000  1  #INCLUDE INCLUDE:KIP
00000000  1  #INCLUDE IC_AREA:SODARU
00000000  1
00000000  1  VAR
00000000  1  $EXTVAR+$
00000000  1      SEMANTIC_ERROR : INT;
00000000  1      APPLY_STACK : A_TOKEN_PTR;
00000000  1      CMD_STACK : CMD_ARRAY_PTR;
00000000  1      SPEC_STACK_PTR : SPECABLE_TYPE_PTR;
00000000  1      DEFAULT_FILE : VECTOR0_7;
00000000  1      DEFAULT_DISC : INT;
00000000  1      DEFAULT_PROC : VECTOR0_7;
00000000  1      DEFAULT_LINE : INT;
00000000  1      SOURCE_FILE : VECTOR0_7;
00000000  1      SOURCE_DISC : INT;
00000000  1      SOURCE_DCB : INT;
00000000  1      SOURCE_UP : INT;
00000000  1      DEFAULT_FORMATS : ARRAY[0..2] OF FMT_PTR;
00000000  1      FIELDS : ARRAY[0..2] OF VALID_PTR;
00000000  1      TEMP_FORMAT : FMT;
00000000  1      TEMP_FIELD : FIELD;
00000000  1      FILE_NAME : VECTOR0_7;
00000000  1      FILE_DISC : INT;
00000000  1      MEASUREMENT_TYPE : INT;
00000000  1      MEAS_DISP_TYPE : INT;
00000000  1      VALID_FOOTDC : BOOLEAN;
00000000  1      PROTECTED : INT;
00000000  1      SYMBOL_COUNT : INT;
00000000  1      CONFIGURATION : CONFIG_REC_TYPE;
00000000  1      MEAS_SETUP : CMD_ARRAY;
00000000  1      C_AREA : INT;
00000000  1  $EXTVAR-$
00000000  1      PROC_IDENT : VECTOR0_7;
```

```
00000010  1      PROCESSOR_ID : INT;
00000012  1      LANGUAGE_ID : INT;
00000014  1      PROCEDURE_NUM : INT;
00000016  1      PROGRAM_NUM : INT;
00000018  1      I : INT;
0000001A  1      NUM : INT;
0000001C  1      TEMP : INT;
0000001E  1      RETURN_CODE : INT;
00000020  1      BOOL_TEMP : BOOLEAN;
00000021  1      INT_TEMP : INTEGER;
00000026  1
00000026  1  $CALL_ABS_LONG ON$
00000000  1  PROCEDURE BPC_WRITE (ADDR_68K : PTR; ADDR_BPC : INT; LENGTH : INT); EXTERNAL;
00000000  1  PROCEDURE BPC_READ (ADDR_68K : PTR; ADDR_BPC : INT; LENGTH : INT); EXTERNAL;
00000000  1  PROCEDURE P_OPEN (VAR FNAME : VECTORO_7; FTYPE, DISC : INT;
00000000  2                   VAR DCB : INT; BUFSIZE : INT;
00000000  2                   VAR FMGR_CODE : INT); EXTERNAL;
00000000  1  PROCEDURE READ_DCB_ADDR (VAR DCB : INT; VAR ADDRESS : INT; VAR FMGR_CODE : INT); EXTERNAL;
00000000  1  PROCEDURE P_CLOSE (VAR DCB : INT; VAR FMGR_CODE : INT); EXTERNAL;
00000000  1  PROCEDURE P_FILI_ERR (VAR DCB : INT; FMGR_CODE : INT); EXTERNAL;
00000000  1  PROCEDURE LOAD_ABS_FILE(VAR FILE_NAME : VECTORO_7; VAR FILE_DISC : INT; MEMORY : INT; VAR ERROR : INT); EXTERNAL;
00000000  1  PROCEDURE RUN(ADDRESS : INTEGER; FLAG : INT; VAR ERROR : INT); EXTERNAL;
00000000  1  PROCEDURE DEFINE_IMB(ACTION : INT; REQUEST : INT; VAR RETURN_CODE : INT); EXTERNAL;
00000000  1  PROCEDURE OUTIT(L :  CHAR; V : INT; B : CHAR); EXTERNAL;
00000000  1  PROCEDURE PROG_INIT(FILE_NAME : INTEGER; VAR DISC : INT; VAR PROGNO, PROCID, LANGUAGE, ERROR : INT); EXTERNAL;
00000000  1  PROCEDURE BUILD_CMD_STACK(ACTION : OP_CODES); EXTERNAL;
00000000  1  FUNCTION  SYMBOL_EXISTS(PATH : PATH_PTR) : BOOLEAN; EXTERNAL;
00000000  1  PROCEDURE ADD_TO_STACK(VAR STACK :SPECABLE_TYPE_PTR; OP_CODE : INT; S_VAL : INT;
00000000  2                          L_VAL : INTEGER; VAR IDENT : VECTORO_7); EXTERNAL;
00000000  1  PROCEDURE GENERAL_MESSAGE(MESS_NUM : INT; MESSAGE_CODE : MESSAGE_TYPES); EXTERNAL;
00000000  1  PROCEDURE SYSTEM_MESSAGE(MESS_NUM, MESS_CODE : INT; MESSAGE : MESSAGE_TYPES); EXTERNAL;
00000000  1  PROCEDURE EMUL_MSG(STACK_MSG : BOOLEAN); EXTERNAL;
00000000  1  FUNCTION  DB_ERROR(ERROR : INT) : BOOLEAN; EXTERNAL;
00000000  1  PROCEDURE SYMBOL_MESSAGE(MESS_NUM : INT; VAR IDENT : VECTORO_7; MESSAGE : MESSAGE_TYPES); EXTERNAL;
00000000  1  PROCEDURE FILE_MESSAGE(MESS_NUM : INT; FILE_NAME : VECTORO_7; FILE_DISC : INT;
00000000  2                         MESSAGE_CODE : MESSAGE_TYPES); EXTERNAL;
00000000  1  $CALL_PC_SHORT ON$
00000000  1  PROCEDURE PUSH_SINGLE(VALUE : INT); EXTERNAL;
00000000  1  PROCEDURE PUSH_DOUBLE(VALUE : DOUBLE_WORD); EXTERNAL;
00000000  1  PROCEDURE POP_SINGLE(VAR VALUE : INT); EXTERNAL;
00000000  1  PROCEDURE ADD_ACCESS(ADDESS : INT); EXTERNAL;
00000000  1  PROCEDURE SAVE_CONFIGURATION; EXTERNAL;
00000000  1  PROCEDURE LOAD_CONFIGURATION; EXTERNAL;
00000000  1
00000000  1  $GLOBPROC+$
00000000  1
00000000  1  FUNCTION NO_IMB : BOOLEAN;
00000004  2  BEGIN
00000004  2  NO_IMB := FALSE;
00000008  2  IF (CONFIGURATION.ENABLE_IMB.DRIVE = NO_WAY_JOSE) AND
00000008  2     (CONFIGURATION.ENABLE_IMB.RECEIVE = NO_WAY_JOSE) AND
00000008  2     (CONFIGURATION.DISABLE_IMB.DRIVE = NO_WAY_JOSE) AND
00000008  2     (CONFIGURATION.DISABLE_IMB.RECEIVE = NO_WAY_JOSE) THEN
0000003A  2      NO_IMB := TRUE;
00000040  2  END;
00000000  1
00000000  1  PROCEDURE TURN_OFF_IMB;
0000004E  2  BEGIN
0000004E  2  CONFIGURATION.ENABLE_IMB.RECEIVE := NO_WAY_JOSE;
00000052  2  CONFIGURATION.DISABLE_IMB.RECEIVE := NO_WAY_JOSE;
00000056  2  CONFIGURATION.ENABLE_IMB.DRIVE := NO_WAY_JOSE;
0000005A  2  CONFIGURATION.DISABLE_IMB.DRIVE := NO_WAY_JOSE;
0000005E  2  DEFINE_IMB(1,-1,RETURN_CODE);         {receive master_enable off}
00000072  2  DEFINE_IMB(1,-2,RETURN_CODE);         {receive trigger_enable off}
00000086  2  DEFINE_IMB(1,-3,RETURN_CODE);         {receive storage_enable off}
0000009A  2  DEFINE_IMB(1,-4,RETURN_CODE);         {receive tigger off}
000000AE  2  DEFINE_IMB(0,-2,RETURN_CODE);         {drive trigger_enable off}
000000C0  2  DEFINE_IMB(0,-3,RETURN_CODE);         {drive storage_enable off}
000000D2  2  DEFINE_IMB(0,-4,RETURN_CODE);         {drive trigger off}
000000E4  2  END;
00000000  1
00000000  1  PROCEDURE SEMANTIC_APPLY(STATE:INT);
00000000  2  VAR
00000000  2      ERROR : INT;
```

```
00000002  2      PATH : PATH_PTR;
000000EC  2  BEGIN
000000EC  2  CASE STATE OF                    {START_OF_CASE_STATEMENT}
000000F6  2
000000F6  2          {<byte_address> ::= byte_address}
000000F6  2         27
000000F6  2         : BEGIN                   {BYTE_ADDR_S6}
000000F6  2          PUSH_DOUBLE(APPLY_STACK^.VALUE);
00000104  2          END;
00000108  2
00000108  2          {<command> ::= setup trace data_flow <trace_data_list>}
00000108  2         32
00000108  2         : BEGIN                   {TR_DATA_S6}
00000108  2          BUILD_CMD_STACK(TR_DAT);
00000114  2          END;
00000118  2
00000118  2          {<command> ::= setup trace variables <trace_var_vars> }
00000118  2         33
00000118  2         : BEGIN                   {TR_VAR_S6}
00000118  2          BUILD_CMD_STACK(TR_VAR);
00000122  2          END;
00000126  2
00000126  2          {<command> ::= setup trace statements}
00000126  2         34
00000126  2         : BEGIN                   {TR_XXX_S6}
00000126  2          ADD_TO_STACK(SPEC_STACK_PTR,SPEC_END,I,INTEGER(I),VECTOR0_7(I));
0000014A  2          BUILD_CMD_STACK(TR_XXX);
00000156  2          END;
0000015A  2
0000015A  2          {<command> ::= setup trace statements <statement_type>}
0000015A  2         35
0000015A  2         : BEGIN                   {TR_STATE_S6}
0000015A  2          BUILD_CMD_STACK(TR_STA);
00000166  2          END;
0000016A  2
0000016A  2          {<command> ::= setup trace modules <module_type>}
0000016A  2         36
0000016A  2         : BEGIN                   {TR_MOD_S6}
0000016A  2          BUILD_CMD_STACK(TR_MOD);
00000176  2          END;
0000017A  2
0000017A  2          {<command> ::= setup count statements <statement_type>}
0000017A  2         37
0000017A  2         : BEGIN                   {CT_STATE_S6}
0000017A  2          BUILD_CMD_STACK(CT_STA);
00000186  2          END;
0000018A  2
0000018A  2  (*******************************************************************)
0000018A  2  (*      {<command> ::= setup count modules <modules_type>}        *)
0000018A  2  (*      0                                                          *)
0000018A  2  (*     : BEGIN                   {CT_MOD_S6}                       *)
0000018A  2  (*      BUILD_CMD_STACK(CT_MOD);                                   *)
0000018A  2  (*      END;                                                       *)
0000018A  2  (*                                                                 *)
0000018A  2  (*      {<command> ::= setup time statements <statement_type>}    *)
0000018A  2  (*      0                                                          *)
0000018A  2  (*     : BEGIN                   {TI_STATE_S6}                     *)
0000018A  2  (*      BUILD_CMD_STACK(TI_STA);                                   *)
0000018A  2  (*      END;                                                       *)
0000018A  2  (*******************************************************************)
0000018A  2
0000018A  2          {<command> ::= setup time modules <modules_type>}
0000018A  2         38
0000018A  2         : BEGIN                   {TI_MOD_S6}
0000018A  2          BUILD_CMD_STACK(TI_MOD);
00000196  2          END;
0000019A  2
0000019A  2          {<command> ::= break on <break_list>}
0000019A  2         39
0000019A  2         : BEGIN                   {BRK_ON_S6}
0000019A  2          BUILD_CMD_STACK(BRK_ON);
000001A6  2          END;
000001AA  2
000001AA  2          {<command> ::= break on measurement_complete}
```

```
000001AA  2          41
000001AA  2          : BEGIN                 {BREAK_ON_S6}
000001AA  2            END;
000001AE  2
000001AE  2            {<command> ::= modify <variable_desc> = <value_type>}
000001AE  2          47, 48
000001AE  2          : BEGIN                 {MODIFY_VAR_S6}
000001AE  2            BUILD_CMD_STACK(MOD_VAR);
000001BA  2            END;
000001BE  2
000001BE  2            {<command> ::= display <variable_desc>}
000001BE  2          49
000001BE  2          : BEGIN                 {DISPLAY_VAR_S6}
000001BE  2            BUILD_CMD_STACK(DISP_VAR);
000001CA  2            END;
000001CE  2
000001CE  2            {<command> ::= show measurement}
000001CE  2            {<command> ::= show measurement default}
000001CE  2          50, 57
000001CE  2          : BEGIN                 {SHOW_MEAS_DEF_S6}
000001CE  2            IF NOT VALID_FOOTDC THEN
000001D6  2                 SEMANTIC_ERROR := 3;
000001DC  2            END;
000001E0  2
000001E0  2            {<command> ::= show source}
000001E0  2          52
000001E0  2          : BEGIN                 {SHOW_SOURCE_S6}
000001E0  2            IF DEFAULT_FILE[0] = 0020H THEN
000001EC  2                 SEMANTIC_ERROR := 39
000001F6  2            ELSE BEGIN
000001F6  2                 P_OPEN(DEFAULT_FILE,2,DEFAULT_DISC,TEMP,1,RETURN_CODE);
0000021A  2                 IF RETURN_CODE <> 0 THEN
00000222  2                      BEGIN
00000222  2                      P_FILE_ERR(TEMP,RETURN_CODE);
00000232  2                      SEMANTIC_ERROR := -i;
00000238  2                      END
0000023C  2                 ELSE BEGIN
0000023C  2                      P_CLOSE(TEMP,RETURN_CODE);
0000024C  2                      SOURCE_FILE := DEFAULT_FILE;
0000025C  2                      SOURCE_DISC := DEFAULT_DISC;
00000262  2                      IF SOURCE_UP = 1 THEN
0000026E  2                           BEGIN
0000026E  2                           P_CLOSE(SOURCE_DCB,RETURN_CODE);
0000027E  2                           SOURCE_UP := 0;
00000282  2                           END;
00000282  2                      END;
00000282  2                 END;
00000282  2            END;
00000286  2
00000286  2            {<command> ::= show source <file_name>}
00000286  2          53
00000296  2          : BEGIN                 {SHOW_SOURCE_FILE_S6}
00000296  2            P_OPEN(FILE_NAME,2,FILE_DISC,TEMP,1,RETURN_CODE);
000002AA  2            IF RETURN_CODE <> 0 THEN
000002B2  2                 BEGIN
000002B2  2                 P_FILE_ERR(TEMP,RETURN_CODE);
000002C2  2                 SEMANTIC_ERROR := -1;
000002C8  2                 END
000002CC  2            ELSE BEGIN
000002CC  2                 P_CLOSE(TEMP,RETURN_CODE);
000002DC  2                 SOURCE_FILE := FILE_NAME;
000002EC  2                 SOURCE_DISC := FILE_DISC;
000002F2  2                 IF SOURCE_UP = 1 THEN
000002FE  2                      BEGIN
000002FE  2                      P_CLOSE(SOURCE_DCB,RETURN_CODE);
0000030E  2                      SOURCE_UP := 0;
00000312  2                      END;
00000312  2                 END;
00000312  2            END;
00000316  2
00000316  2            {<command> ::= display modify}
00000316  2          58
00000316  2          : BEGIN                 {DISPLAY_MODIFY_S6}
00000316  2            IF NOT VALID_FOOTDC THEN
0000031E  2                 SEMANTIC_ERROR := 3;
00000324  2            END;
```

```
00000328  2
00000328  2        {<command> ::= display <display_list>}
00000328  2       60
00000328  2       : BEGIN               {SHOW_MEAS_LIST_S6}
00000328  2        IF NOT VALID_FOOTDC THEN
00000330  2             SEMANTIC_ERROR := 3;
00000336  2        TEMP_FORMAT[I].IDENT := TERMINAT;
00000346  2        END;
0000034A  2
0000034A  2        {<command> ::= execute}
0000034A  2        {<command> ::= execute repeatitive}
0000034A  2       62, 63
0000034A  2       : BEGIN               {EXECUTE_S6}
0000034A  2        END;
0000034E  2
0000034E  2        {<command> ::= load <file_name>}
0000034E  2       65
0000034E  2       : BEGIN               {LOAD_S6}
0000034E  2        LOAD_ABS_FILE(FILE_NAME,FILE_DISC,0,RETURN_CODE);
00000368  2        IF RETURN_CODE = 0 THEN
00000370  2             BEGIN
00000370  2             EMUL_MSG(TRUE);
0000037C  2             CONFIGURATION.ABS_FILE := FILE_NAME;
0000038C  2             CONFIGURATION.ABS_DISC := FILE_DISC;
00000392  2             END;
00000392  2        END;
00000396  2
00000396  2        {<command> ::= load emulation_memory <file_name>}
00000396  2       66
00000396  2       : BEGIN               {LOAD_EMUL_S6}
00000396  2        LOAD_ABS_FILE(FILE_NAME,FILE_DISC,1,RETURN_CODE);
000003B2  2        IF RETURN_CODE = 0 THEN
000003BA  2             BEGIN
000003BA  2             EMUL_MSG(TRUE);
000003C6  2             CONFIGURATION.ABS_FILE := FILE_NAME;
000003D6  2             CONFIGURATION.ABS_DISC := FILE_DISC;
000003DC  2             END;
000003DC  2        END;
000003E0  2
000003E0  2        {<command> ::= load user_memory <file_name>}
000003E0  2       67
000003E0  2       : BEGIN               {LOAD_USER_S6}
000003E0  2        LOAD_ABS_FILE(FILE_NAME,FILE_DISC,2,RETURN_CODE);
000003FC  2        IF RETURN_CODE = 0 THEN
00000404  2             BEGIN
00000404  2             EMUL_MSG(TRUE);
00000410  2             CONFIGURATION.ABS_FILE := FILE_NAME;
00000420  2             CONFIGURATION.ABS_DISC := FILE_DISC;
00000426  2             END;
00000426  2        END;
0000042A  2
0000042A  2        {<command> ::= run [at_execution] from_start}
0000042A  2       68
0000042A  2       : BEGIN               {RUN_S6}
0000042A  2        BUILD_CMD_STACK(AT_RUN);
00000436  2        IF SEMANTIC_ERROR = 0 THEN
0000043E  2             BEGIN
0000043E  2             IF CONFIGURATION.RUN_CMD = FROM_ADRS THEN
0000044A  2                  BEGIN
0000044A  2                  I := 0;
0000044E  2                  WHILE (CMD_STACK^[I].OP_CODE <> PROC_OP) AND
0000044E  2                        (CMD_STACK^[I].OP_CODE <> LINE_OP) AND
0000044E  2                        (CMD_STACK^[I].OP_CODE <> VALUE_OP) AND
0000044E  2                        (CMD_STACK^[I].OP_CODE <> EOL) DO
000004B4  2                       I := I + 1;
000004BA  2                  IF (CMD_STACK^[I].OP_CODE = PROC_OP) OR
000004BA  2                     (CMD_STACK^[I].OP_CODE = LINE_OP) THEN
000004F0  2                       CONFIGURATION.RUN_ADRS := CMD_STACK^[I].ADDRESS
00000506  2                  ELSE
00000506  2                       IF CMD_STACK^[I].OP_CODE = VALUE_OP THEN
0000051E  2                            CONFIGURATION.RUN_ADRS := CMD_STACK^[I].VAL_VALUE
```

```
00000534  2                    ELSE
00000534  2                        SYSTEM_MESSAGE(1111,0,Error);
00000546  2                END;
00000546  2            CONFIGURATION.RUN_AT_EXEC := BOOL_TEMP;
0000054C  2            IF NOT CONFIGURATION.RUN_AT_EXEC THEN
00000554  2                BEGIN
00000554  2                RUN(CONFIGURATION.RUN_ADRS,INT(CONFIGURATION.RUN_CMD),ERROR);
00000570  2                EMUL_MSG(FALSE);
0000057A  2                IF ERROR <> 0 THEN
00000582  2                    IF ERROR = 1 THEN
0000058E  2                        SEMANTIC_ERROR := 16
00000598  2                    ELSE
00000598  2                        SEMANTIC_ERROR := 45;
0000059E  2                END;
0000059E  2            END;
0000059E  2        END;
000005A2  2
000005A2  2        {<command> ::= break}
000005A2  2      70
000005A2  2      : BEGIN                {BREAK_S6}
000005A2  2        END;
000005A6  2
000005A6  2        {<command> ::= copy measurement <copy_limits> to <listfile_desc>}
000005A6  2      71
000005A6  2      : BEGIN                {COPY_MEAS_S6}
000005A6  2        IF NOT VALID_FOOTDC THEN
000005AE  2            SEMANTIC_ERROR := 3;
000005B4  2        END;
000005B8  2
000005B8  2        {<command> ::= configuration saved_in <file_name>}
000005B8  2      76
000005B8  2      : BEGIN                {CONFIG_SAVE_S6}
000005B8  2        SAVE_CONFIGURATION;
000005BC  2        END;
000005C0  2
000005C0  2        {<command> ::= hot_wire <file_name>}
000005C0  2      78
000005C0  2      : BEGIN                {CONFIG_LOAD_S6}
000005C0  2        LOAD_CONFIGURATION;
000005C4  2        END;
000005C8  2
000005C8  2        {<command> ::= setup enable off}
000005C8  2      82
000005C8  2      : BEGIN                {ENABLE_OFF_S6}
000005C8  2        ADD_TO_STACK(SPEC_STACK_PTR,SPEC_OPERAND,SPEC_OP_OFF,INTEGER(I),VECTOR0_7(I));
000005EC  2        BUILD_CMD_STACK(CD_ENA);
000005F8  2        IF (CONFIGURATION.ENABLE_INB.DRIVE <> NO_WAY_JOSE) OR
000005F8  2           (CONFIGURATION.ENABLE_INB.RECEIVE <> NO_WAY_JOSE) THEN
00000612  2                GENERAL_MESSAGE(49,Warning);
00000622  2        END;
00000626  2
00000626  2        {<command> ::= setup enable on ...}
00000626  2      83
00000626  2      : BEGIN                {ENABLE_ON_S6}
00000626  2        BUILD_CMD_STACK(CD_ENA);
00000632  2        IF BOOL_TEMP THEN
0000063A  2            IF (CONFIGURATION.ENABLE_INB.DRIVE = NO_WAY_JOSE) AND
0000063A  2               (CONFIGURATION.ENABLE_INB.RECEIVE = NO_WAY_JOSE) THEN
00000654  2                    GENERAL_MESSAGE(62,Warning);
00000664  2        END;
00000668  2
00000668  2        {<command> ::= setup disable off}
00000668  2      84
00000668  2      : BEGIN                {DISABLE_OFF_S6}
00000668  2        ADD_TO_STACK(SPEC_STACK_PTR,SPEC_OPERAND,SPEC_OP_OFF,INTEGER(I),VECTOR0_7(I));
0000068C  2        BUILD_CMD_STACK(CD_DIS);
00000698  2        IF (CONFIGURATION.DISABLE_INB.DRIVE <> NO_WAY_JOSE) OR
00000698  2           (CONFIGURATION.DISABLE_INB.RECEIVE <> NO_WAY_JOSE) THEN
000006B2  2                GENERAL_MESSAGE(49,Warning);
000006C2  2        END;
000006C6  2
000006C6  2        {<command> ::= setup disable on ...}
000006C6  2      85
000006C6  2      : BEGIN                {DISABLE_ON_S6}
```

```
000006C6  2        BUILD_CMD_STACK(CD_DIS);
000006D2  2        IF BOOL_TEMP THEN
000006DA  2            IF (CONFIGURATION.DISABLE_IMB.DRIVE = NO_WAY_JOSE) AND
0000065A  2               (CONFIGURATION.DISABLE_IMB.RECEIVE = NO_WAY_JOSE) THEN
000006F4  2                    GENERAL_MESSAGE(62,Warning);
00000704  2        END;
00000708  2
00000708  2        {[<window>] ::= window}
00000708  2       87
00000708  2       : BEGIN               {WINDOW_S6}
00000708  2        IF CONFIGURATION.REAL_TIME THEN
00000710  2            SEMANTIC_ERROR := 57;
00000716  2        END;
0000071A  2
0000071A  2        {<condition> ::= any_state}
0000071A  2       88
0000071A  2       : BEGIN               {ANY_STATE_S6}
0000071A  2        ADD_TO_STACK(SPEC_STACK_PTR,SPEC_OPERAND,SPEC_OP_ANY,INTEGER(I),VECTORO_7(I));.
0000073E  2        BOOL_TEMP := TRUE;
00000744  2        END;
00000748  2
00000748  2        {<condition> ::= <recursive_term>}
00000748  2       89
00000748  2       : BEGIN               {NO_ANY_STATE_S6}
00000748  2        BOOL_TEMP := FALSE;
0000074C  2        END;
00000750  2
00000750  2        {<followed_by> ::= followed_by}
00000750  2       97
00000750  2       : BEGIN                  {FOLLOWED_BY_S6}
00000750  2        ADD_TO_STACK(SPEC_STACK_PTR,SPEC_OPERAND,SPEC_OP_BY,INTEGER(I),VECTORO_7(I))
00000774  2        END;
00000778  2
00000778  2        {<or> ::= or}
00000778  2       98
00000778  2       : BEGIN                  {OR_S6}
00000778  2        ADD_TO_STACK(SPEC_STACK_PTR,SPEC_OPERAND,SPEC_OP_OR,INTEGER(I),VECTORO_7(I))
0000079C  2        END;
000007A0  2
000007A0  2        {<signed_value> ::= <value>}
000007A0  2       105
000007A0  2       : BEGIN                  {POS_VALUE_S6}
000007A0  2        ADD_TO_STACK(SPEC_STACK_PTR,SPEC_VALUE,I,INT_TEMP,VECTORO_7(I));
000007C0  2        END;
000007C4  2
000007C4  2        {<signed_value> ::= - <value>}
000007C4  2       106
000007C4  2       : BEGIN                  {NEG_VALUE_S6}
000007C4  2        ADD_TO_STACK(SPEC_STACK_PTR,SPEC_VALUE,I, - INT_TEMP,VECTORO_7(I));
000007E8  2        END;
000007EC  2
000007EC  2        {<value> ::= value}
000007EC  2       107
000007EC  2       : BEGIN                  {VALUE_S6}
000007EC  2        INT_TEMP := INTEGER(APPLY_STACK^.VALUE);
000007F6  2        END;
000007FA  2
000007FA  2  (*********************************************************************)
000007FA  2  (*      {<dx_integer> ::= dx_integer}                                *)
000007FA  2  (*    113                                                            *)
000007FA  2  (*    : BEGIN                  {DX_INTEGER_S6}.                      *)
000007FA  2  (*     VALUE := INTEGER(APPLY_STACK^.VALUE);                         *)
000007FA  2  (*     MASK := INTEGER(APPLY_STACK^.MASK);                           *)
000007FA  2  (*     END;                                                          *)
000007FA  2  (*                                                                   *)
000007FA  2  (*     {<eq_neq> ::= =}                                              *)
000007FA  2  (*     {<rel_op> ::= =}                                              *)
000007FA  2  (*    119,121                                                        *)
000007FA  2  (*    : BEGIN                  {EQUAL_S6}                            *)
000007FA  2  (*     NUM := 2;                                                     *)
000007FA  2  (*     I := SPEC_OP_EQ;                                              *)
000007FA  2  (*     END;                                                          *)
000007FA  2  (*                                                                   *)
000007FA  2  (*     {<eq_neq> ::= <>}                                             *)
000007FA  2  (*     {<rel_op> ::= <>}                                             *)
```

```
000007FA  2  (*    120,124                                                    *)
000007FA  2  (*     : BEGIN                   {NOTEQUAL_S6}                   *)
000007FA  2  (*       NUM := 5;                                               *)
000007FA  2  (*       I := SPEC_OP_NE;                                        *)
000007FA  2  (*       END;                                                    *)
000007FA  2  (*                                                               *)
000007FA  2  (*     {<rel_op> ::= <>}                                         *)
000007FA  2  (*    122                                                        *)
000007FA  2  (*     : BEGIN                   {LESS_S6},                      *)
000007FA  2  (*       NUM := 4;                                               *)
000007FA  2  (*       I := SPEC_OP_LT;                                        *)
000007FA  2  (*       END;                                                    *)
000007FA  2  (*                                                               *)
000007FA  2  (*     {<rel_op> ::= >}                                          *)
000007FA  2  (*    123                                                        *)
000007FA  2  (*     : BEGIN                   {GREATER_S6}                    *)
000007FA  2  (*       NUM := 1;                                               *)
000007FA  2  (*       I := SPEC_OP_GT;                                        *)
000007FA  2  (*       END;                                                    *)
000007FA  2  (*                                                               *)
000007FA  2  (*     {<rel_op> ::= <=}                                         *)
000007FA  2  (*    125                                                        *)
000007FA  2  (*     : BEGIN                   {LESSEQUAL_S6}                  *)
000007FA  2  (*       NUM := 6;                                               *)
000007FA  2  (*       I := SPEC_OP_LE;                                        *)
000007FA  2  (*       END;                                                    *)
000007FA  2  (*                                                               *)
000007FA  2  (*     {<rel_op> ::= >=}                                         *)
000007FA  2  (*    126                                                        *)
000007FA  2  (*     : BEGIN                   {GREATEREQUAL_S6}               *)
000007FA  2  (*       NUM := 3;                                               *)
000007FA  2  (*       I := SPEC_OP_GE;                                        *)
000007FA  2  (*       END;                                                    *)
000007FA  2  (****************************************************************)
000007FA  2
000007FA  2         {<when> ::= empty}
000007FA  2        113
000007FA  2         : BEGIN                   {ENTRY_EXIT_S6}
000007FA  2           ADD_TO_STACK(SPEC_STACK_PTR,SPEC_OPERAND,SPEC_OP_EE,INTEGER(I),VECTORO_7(I)),
0000081E  2           END;
00000822  2
00000822  2         {<when> ::= entry_only}
00000822  2        115
00000822  2         : BEGIN                   {ENTRY_S6}
00000822  2           ADD_TO_STACK(SPEC_STACK_PTR,SPEC_OPERAND,SPEC_OP_EN,INTEGER(I),VECTORO_7(I));
00000846  2           END;
0000084A  2
0000084A  2         {<when> ::= exit_only}
0000084A  2        116
0000084A  2         : BEGIN                   {EXIT_S6}
0000084A  2           ADD_TO_STACK(SPEC_STACK_PTR,SPEC_OPERAND,SPEC_OP_EX,INTEGER(I),VECTORO_7(I));
0000086E  2           END;
00000872  2
00000872  2         {<access> ::= empty}
00000872  2        120
00000872  2         : BEGIN                   {READ_WRITE_S6}
00000872  2           ADD_TO_STACK(SPEC_STACK_PTR,SPEC_OPERAND,SPEC_OP_RW,INTEGER(I),VECTORO_7(I));
00000896  2           END;
0000089A  2
0000089A  2         {<access> ::= read_only}
0000089A  2        121
0000089A  2         : BEGIN                   {READ_S6}
0000089A  2           ADD_TO_STACK(SPEC_STACK_PTR,SPEC_OPERAND,SPEC_OP_RE,INTEGER(I),VECTORO_7(I));
000008BE  2           END;
000008C2  2
000008C2  2         {<access> ::= write_only}
000008C2  2        122
000008C2  2         : BEGIN                   {WRITE_S6}
000008C2  2           ADD_TO_STACK(SPEC_STACK_PTR,SPEC_OPERAND,SPEC_OP_WR,INTEGER(I),VECTORO_7(I));
000008E6  2           END;
000008EA  2
000008EA  2         {<all> ::= all}
000008EA  2        131
000008EA  2         : BEGIN                   {ALL_S6}
000008EA  2           ADD_TO_STACK(SPEC_STACK_PTR,SPEC_OPERAND,SPEC_OP_ALL,INTEGER(I),VECTORO_7(I));
```

```
0000090E  2        SYMBOL_COUNT := SYMBOL_COUNT + 1;
00000912  2        IF SYMBOL_COUNT > 10 THEN
0000091E  2             SEMANTIC_ERROR := 7;
00000924  2        IF CONFIGURATION.ABS_FILE[0] = 0020H THEN
00000930  2             SEMANTIC_ERROR := 43;
00000936  2        END;
0000093A  2
0000093A  2        {<line_integer> ::= line_integer}
0000093A  2     133
0000093A  2      : BEGIN                  {LINE_INTEGER_S6}
0000093A  2        PUSH_SINGLE(APPLY_STACK^.VALUE.LSW);
00000948  2        ADD_TO_STACK(SPEC_STACK_PTR,SPEC_LINE,I,INTEGER(APPLY_STACK^.VALUE),VECTOR0_7(I));
0000096C  2        SYMBOL_COUNT := SYMBOL_COUNT + 1;
00000970  2        IF SYMBOL_COUNT > 10 THEN
0000097C  2             SEMANTIC_ERROR := 7;
00000982  2        END;
00000986  2
00000986  2        {<symbol_name> ::= symbol_identifier}
00000986  2     135,136
00000986  2      : BEGIN                  {SYM_IDENT_S6}
00000986  2        PROC_IDENT := APPLY_STACK^.IDENT;
0000099A  2        ADD_TO_STACK(SPEC_STACK_PTR,SPEC_SYMBOL,I,INTEGER(I),PROC_IDENT);
000009BE  2        END;
000009C2  2
000009C2  2        {<module_name> ::= module_identifier}
000009C2  2     138,139
000009C2  2      : BEGIN                  {MOD_IDENT_S6}
000009C2  2        PROC_IDENT := APPLY_STACK^.IDENT;
000009D6  2        ADD_TO_STACK(SPEC_STACK_PTR,SPEC_MODULE,I,INTEGER(I),PROC_IDENT);
000009FA  2        SYMBOL_COUNT := SYMBOL_COUNT + 1;
000009FE  2        IF SYMBOL_COUNT > 10 THEN
00000A0A  2             SEMANTIC_ERROR := 7;
00000A10  2        END;
00000A14  2
00000A14  2        {<display_list> ::= <display_opt>}
00000A14  2     140
00000A14  2      : BEGIN                  {DISP_OPT_S6}
00000A14  2        IF TEMP <> -1 THEN
00000A20  2             TEMP_FIELD.WIDTH := TEMP;
00000A24  2        INT_TEMP := TEMP_FIELD.WIDTH;
00000A2E  2        TEMP_FORMAT[0] := TEMP_FIELD;
00000A34  2        I := 1;
00000A3A  2        END;
00000A3E  2
00000A3E  2        {<display_list> ::= <display_list> then <display_opt>}
00000A3E  2     141
00000A3E  2      : BEGIN                  {DISP_OPTS_S6}
00000A3E  2        IF TEMP <> -1 THEN
00000A4A  2             TEMP_FIELD.WIDTH := TEMP;
00000A4E  2        INT_TEMP := INT_TEMP + TEMP_FIELD.WIDTH;
00000A58  2        IF INT_TEMP > 220 THEN
00000A66  2             SEMANTIC_ERROR := 35;
00000A6C  2        IF I < 9 THEN
00000A78  2             BEGIN
00000A78  2             TEMP_FORMAT[I] := TEMP_FIELD;
00000A84  2             I := I + 1;
00000A88  2             END
00000A8C  2        ELSE
00000A8C  2             SEMANTIC_ERROR := 36;
00000A92  2        END;
00000A96  2
00000A96  2        {<source_line> ::= source_line}
00000A96  2     142
00000A96  2      : BEGIN                  {OPT_SOURCE_S6}
00000A96  2        NUM := FIELDS[MEAS_DISP_TYPE]^[SOURCE_FIELD];
00000AAA  2        IF NUM = -1 THEN
00000AB6  2             SEMANTIC_ERROR := 15
00000AC0  2        ELSE
00000AC0  2             TEMP_FIELD := DEFAULT_FORMATS[MEAS_DISP_TYPE]^[NUM];
00000ADA  2        END;
00000ADE  2
00000ADE  2        {<source_path> ::= source_path}
00000ADE  2     143
00000ADE  2      : BEGIN                  {OPT_SOURCE_PATH_S6}
00000ADE  2        NUM := FIELDS[MEAS_DISP_TYPE]^[SOURCEPATH_FIELD];
```

```
00000AF2  2          IF NUM = -1 THEN
00000AFE  2              SEMANTIC_ERROR := 15
00000B02  2          ELSE
00000B08  2              TEMP_FIELD := DEFAULT_FORMATS[MEAS_DISP_TYPE]^[NUM];
00000B22  2          END;
00000B26  2
00000B26  2          {<data> ::= data}
00000B26  2        144
00000B26  2         : BEGIN                      {OPT_DATA_S6}
00000B26  2          NUM := FIELDS[MEAS_DISP_TYPE]^[VALUE_FIELD];
00000B3A  2          IF NUM = -1 THEN
00000B46  2              SEMANTIC_ERROR := 15
00000B50  2          ELSE
00000B50  2              TEMP_FIELD := DEFAULT_FORMATS[MEAS_DISP_TYPE]^[NUM];
00000B6A  2          END;
00000B6E  2
00000B6E  2          {<symbol> ::= symbol}
00000B6E  2        145
00000B6E  2         : BEGIN                      {OPT_SYMBOL_S6}
00000B6E  2          NUM := FIELDS[MEAS_DISP_TYPE]^[SYMBOL_FIELD];
00000B80  2          IF NUM = -1 THEN
00000B8C  2              SEMANTIC_ERROR := 15
00000B96  2          ELSE
00000B96  2              TEMP_FIELD := DEFAULT_FORMATS[MEAS_DISP_TYPE]^[NUM];
00000BB0  2          END;
00000BB4  2
00000BB4  2          {<symbol_path> ::= symbol_path}
00000BB4  2        146
00000BB4  2         : BEGIN                      {OPT_SYMBOL_PATH_S6}
00000BB4  2          NUM := FIELDS[MEAS_DISP_TYPE]^[SYMBOLPATH_FIELD];
00000BC8  2          IF NUM = -1 THEN
00000BD4  2              SEMANTIC_ERROR := 15
00000BDE  2          ELSE
00000BDE  2              TEMP_FIELD := DEFAULT_FORMATS[MEAS_DISP_TYPE]^[NUM];
00000BF8  2          END;
00000BFC  2
00000BFC  2          {<display_opt> ::= count absolute}
00000BFC  2        147
00000BFC  2         : BEGIN                      {OPT_ABS_S6}
00000BFC  2          NUM := FIELDS[MEAS_DISP_TYPE]^[KC9A_FIELD_ABS];
00000C10  2          IF NUM = -1 THEN
00000C1C  2              SEMANTIC_ERROR := 15
00000C26  2          ELSE
00000C26  2              TEMP_FIELD := DEFAULT_FORMATS[MEAS_DISP_TYPE]^[NUM];
00000C40  2          END;
00000C44  2
00000C44  2          {<display_opt> ::= count relative}
00000C44  2        148
00000C44  2         : BEGIN                      {OPT_REL_S6}
00000C44  2          NUM := FIELDS[MEAS_DISP_TYPE]^[KC9A_FIELD_REL];
00000C58  2          IF NUM = -1 THEN
00000C64  2              SEMANTIC_ERROR := 15
00000C6E  2          ELSE
00000C6E  2              TEMP_FIELD := DEFAULT_FORMATS[MEAS_DISP_TYPE]^[NUM];
00000C88  2          END;
00000C8C  2
00000C8C  2          {<display_opt> ::= count statistics}
00000C8C  2        149
00000C8C  2         : BEGIN                      {OPT_TIM_S6}
00000C8C  2          NUM := FIELDS[MEAS_DISP_TYPE]^[KC9A_FIELD_TIME];
00000CA0  2          IF NUM = -1 THEN
00000CAC  2              SEMANTIC_ERROR := 15
00000CB6  2          ELSE
00000CB6  2              TEMP_FIELD := DEFAULT_FORMATS[MEAS_DISP_TYPE]^[NUM];
00000CD0  2          END;
00000CD4  2
00000CD4  2          {<display_opt> ::= status}
00000CD4  2        150
00000CD4  2         : BEGIN                      {OPT_STATUS_S6}
00000CD4  2          NUM := FIELDS[MEAS_DISP_TYPE]^[STATUS_FIELD];
00000CE8  2          IF NUM = -1 THEN
00000CF4  2              SEMANTIC_ERROR := 15
00000CFE  2          ELSE
00000CFE  2              TEMP_FIELD := DEFAULT_FORMATS[MEAS_DISP_TYPE]^[NUM];
00000D18  2          END;
```

```
00000D1C  2
00000D1C  2          {[<width>] ::= empty}
00000D1C  2         157
00000D1C  2          : BEGIN                  {NO_WIDTH_S6}
00000D1C  2           TEMP := -1;
00000D22  2           END;
00000D26  2
00000D26  2          {<width> ::= width}
00000D26  2         158
00000D26  2          : BEGIN                  {WIDTH_S6}
00000D26  2           TEMP := APPLY_STACK^.VALUE.LSW;
00000D30  2           END;
00000D34  2
00000D34  2          {<integer> ::= integer}
00000D34  2         160
00000D34  2          : BEGIN                  {INTEGER_S6}
00000D34  2           NUM := APPLY_STACK^.VALUE.LSW;
00000D3E  2           END;
00000D42  2
00000D42  2          {<configuration_opt> ::= set_counter to_count_state}
00000D42  2         161
00000D42  2          : BEGIN                  {COUNT_STATE_S6}
00000D42  2           IF MEASUREMENT_TYPE = INT(TI_MOD) THEN
00000D4E  2                SEMANTIC_ERROR := 8;
00000D54  2           END;
00000D58  2
00000D58  2          {<configuration_opt> ::= set_counter to_count_time}
00000D58  2         162
00000D58  2          : BEGIN                  {COUNT_TIME_S6}
00000D58  2           IF MEASUREMENT_TYPE = INT(CT_STA) THEN
00000D64  2                SEMANTIC_ERROR := 8;
00000D6A  2           END;
00000D6E  2
00000D6E  2          {<configuration_opt> ::= real_time optional}
00000D6E  2         163
00000D6E  2          : BEGIN                  {REAL_OPT_S6}
00000D6E  2           IF NOT NO_IMD THEN
00000D76  2                SEMANTIC_ERROR := 42;
00000D7C  2           END;
00000D80  2
00000D80  2          {<configuration_opt> ::= real_time required}
00000D80  2         164
00000D80  2          : BEGIN                  {REAL_REQ_S6}
00000D80  2           IF CONFIGURATION.WINDOW THEN
00000D88  2                SEMANTIC_ERROR := 57;
00000D8E  2           IF  CONFIGURATION.RUN_AT_EXEC THEN
00000D96  2                GENERAL_MESSAGE(47,Warning);
00000DA6  2           END;
00000DAA  2
00000DAA  2          {<configuration_opt> ::= default_path_is <file_name>}
00000DAA  2         165,166
00000DAA  2          : BEGIN                  {DEF_PATH_FILE_S6}
00000DAA  2           DEFAULT_PROC[0] := 0020H;
00000DB0  2           DEFAULT_LINE := -1;
00000DB6  2           PROG_INIT(INTEGER(ADDR(FILE_NAME)),FILE_DISC,PROGRAM_NUM,PROCESSOR_ID.LANGUAGE_ID,ERROR);
00000DDC  2           IF DB_ERROR(ERROR) THEN
00000DEE  2                FILE_MESSAGE(1,FILE_NAME,FILE_DISC,Error)
00000E0E  2           ELSE BEGIN
00000E0E  2                DEFAULT_FILE := FILE_NAME;
00000E1E  2                DEFAULT_DISC := FILE_DISC;
00000E24  2                END;
00000E24  2           END;
00000E28  2
00000E28  2          {<configuration_opt> ::= default_path_is <module_name> <file_name>}
00000E28  2         167
00000E28  2          : BEGIN                  {DEF_PATH_S6}
00000E28  2           DEFAULT_LINE := -1;
00000E2E  2           PROG_INIT(INTEGER(ADDR(FILE_NAME)),FILE_DISC,PROGRAM_NUM,PROCESSOR_ID.LANGUAGE_ID,ERROR);
00000E54  2           IF DB_ERROR(ERROR) THEN
00000E66  2                FILE_MESSAGE(1,FILE_NAME,FILE_DISC,Error)
00000E86  2           ELSE BEGIN
00000E86  2                NEW(PATH);
00000E98  2                PATH^.SYM := PROC_IDENT;
00000EA8  2                PATH^.PROC_NUM := 0;
00000EB0  2                PATH^.PROG_NUM := PROGRAM_NUM;
```

```
00000EDA  2              IF SYMBOL_EXISTS(PATH) THEN
00000ECC  2                   BEGIN
00000ECC  2                   DEFAULT_FILE := FILE_NAME;
00000EDC  2                   DEFAULT_DISC := FILE_DISC;
00000EE2  2                   DEFAULT_PROC := PROC_IDENT;
00000EF2  2                   END
00000EF6  2              ELSE
00000EF6  2                   SYMBOL_MESSAGE(4,PROC_IDENT,Error);
00000F0A  2              DISPOSE(PATH);
00000F1C  2              END;
00000F1C  2         END;
00000F20  2
00000F20  2  (*****************************************************************)
00000F20  2  (*      {<configuration_opt> ::= default_path_is <block_name> <file_name>}
00000F20  2  (*    142                                                          *)
00000F20  2  (*     : BEGIN               {DEF_PATH_LINE_S6}                   *)
00000F20  2  (*       DEFAULT_PROC[0] := 0020H;                                 *)
00000F20  2  (*       DEFAULT_LINE := NUM;                                      *)
00000F20  2  (*       PROC_INIT(INTEGER(ADDR(FILE_NAME)),FILE_DISC,PROGRAM_NUM,PROCESSOR_ID,LANGUAGE_ID,ERROR);
00000F20  2  (*       IF DD_ERROR(ERROR) THEN                                   *)
00000F20  2  (*            FILE_MESSAGE(1,FILE_NAME,FILE_DISC,Error)            *)
00000F20  2  (*       ELSE BEGIN                                                *)
00000F20  2  (*            DEFAULT FILE := FILE NAME;                           *)
00000F20  2  (*            DEFAULT_DISC := FILE_DISC;                           *)
00000F20  2  (*            END;                                                 *)
00000F20  2  (*       END;                                                      *)
00000F20  2  (*****************************************************************)
00000F20  2
00000F20  2       {<configuration_opt> ::= absolute_file <file_name>}
00000F20  2     168
00000F20  2      : BEGIN              {ABS_FILE_S6}
00000F20  2        P_OPEN(FILE_NAME,4,FILE_DISC,TEMP,1,RETURN_CODE);
00000F44  2        IF RETURN_CODE <> 0 THEN
00000F4C  2             BEGIN
00000F4C  2             P_FILE_ERR(TEMP,RETURN_CODE);
00000F5C  2             SEMANTIC_ERROR := -1;
00000F62  2             END
00000F66  2        ELSE BEGIN
00000F66  2             READ_DCB_ADDR(TEMP,I,RETURN_CODE);
00000F7E  2             DPC_READ(PTR(ADDR(NUM)),I + 8,1);
00000F98  2             CONFIGURATION.ABS_FILE := FILE_NAME;
00000FA8  2             CONFIGURATION.ABS_DISC := SHIFT(NUM,-8);
00000FB2  2             DPC_WRITE(PTR(ADDR(CONFIGURATION.ABS_FILE)),G_AREA + ABS_FILE_OFF,8);
00000FCE  2             DPC_WRITE(PTR(ADDR(CONFIGURATION.ABS_DISC)),G_AREA + ABS_DISC_OFF,1);
00000FEA  2             END;
00000FEA  2        P_CLOSE(TEMP,RETURN_CODE);
00000FFA  2        END;
00000FFE  2
00000FFE  2       {<configuration_opt> ::= trigger_enable always}
00000FFE  2     169
00000FFE  2      : BEGIN              {IMB_OFF_S6}
00000FFE  2        TURN_OFF_IMB;
00001002  2        END;
00001006  2
00001006  2       {<configuration_opt> ::= trigger_enable received measurement_enable}
00001006  2     170
00001006  2      : BEGIN              {IMB_RECEIVE_ENABLE_S6}
00001006  2        IF CONFIGURATION.RUN_AT_EXEC = TRUE THEN
00001012  2             SEMANTIC_ERROR := 13
0000101C  2        ELSE IF NOT CONFIGURATION.REAL_TIME THEN
00001024  2             SEMANTIC_ERROR := 41
0000102E  2        ELSE BEGIN
0000102E  2             TURN_OFF_IMB;
00001032  2             DEFINE_IMB(1,+1,RETURN_CODE);      {receive master_enable}
00001046  2             DEFINE_IMB(1,+2,RETURN_CODE);      {receive trigger_enable}
0000105A  2             DEFINE_IMB(1,-3,RETURN_CODE);      {receive storage_enable off}
0000106E  2             DEFINE_IMB(1,-4,RETURN_CODE);      {receive trigger off}
00001082  2             CONFIGURATION.ENABLE_IMB.RECEIVE := TRIGGER_ENABLE;
00001088  2             IF MEAS_SETUP[START_ON].CMD = NIL THEN
00001090  2                  GENERAL_MESSAGE(49,Warning);
000010A0  2             END;
000010A0  2        END;
000010A4  2
000010A4  2       {<configuration_opt> ::= trigger_enable received measurement_disable}
000010A4  2     171
```

```
000010A4  2        : BEGIN              {IMB_RECEIVE_DISABLE_S6}
000010A4  2          IF CONFIGURATION.RUN_AT_EXEC = TRUE THEN
000010B0  2               SEMANTIC_ERROR := 13
000010BA  2          ELSE IF NOT CONFIGURATION.REAL_TIME THEN
000010C2  2               SEMANTIC_ERROR := 41
000010CC  2          ELSE BEGIN
000010CC  2               TURN_OFF_IMB;
000010D0  2               DEFINE_IMB(1,+1,RETURN_CODE);      {receive master_enable}
000010E4  2               DEFINE_IMB(1,+2,RETURN_CODE);      {receive trigger_enable}
000010F8  2               DEFINE_IMB(1,-3,RETURN_CODE);      {receive storage_enable off}
0000110C  2               DEFINE_IMB(1,-4,RETURN_CODE);      {receive trigger off}
00001120  2               CONFIGURATION.DISABLE_IMB.RECEIVE := TRIGGER_ENABLE;
00001126  2               IF MEAS_SETUP[STOP_ON].CMD = NIL THEN
0000112E  2                    GENERAL_MESSAGE(49,Warning);
0000113E  2               END;
0000113E  2          END;
00001142  2
00001142  2          {<configuration_opt> ::= trigger_enable driven_only measurement_enable}
00001142  2        172
00001142  2        : BEGIN              {IMB_DRIVE_ENABLE_S6}
00001142  2          IF CONFIGURATION.RUN_AT_EXEC = TRUE THEN
0000114E  2               SEMANTIC_ERROR := 13
00001158  2          ELSE IF NOT CONFIGURATION.REAL_TIME THEN
00001160  2               SEMANTIC_ERROR := 41
0000116A  2          ELSE BEGIN
0000116A  2               TURN_OFF_IMB;
0000116E  2               DEFINE_IMB(1,+1,RETURN_CODE);      {receive master_enable}
00001182  2               DEFINE_IMB(0,-3,RETURN_CODE);      {drive storage_enable off}
00001194  2               DEFINE_IMB(0,-4,RETURN_CODE);      {drive trigger off}
000011A6  2               DEFINE_IMB(0,+2,RETURN_CODE);      {drive trigger_enable}
000011B8  2               IF RETURN_CODE < 0 THEN
000011C0  2                    GENERAL_MESSAGE(40,Warning);
000011D0  2               CONFIGURATION.ENABLE_IMB.DRIVE := TRIGGER_ENABLE;
000011D6  2               IF MEAS_SETUP[START_ON].CMD = NIL THEN
000011DE  2                    GENERAL_MESSAGE(49,Warning);
000011EE  2               END;
000011EE  2          END;
000011F2  2
000011F2  2          {<configuration_opt> ::= trigger_enable driven_only measurement_disable}
000011F2  2        173
000011F2  2        : BEGIN              {IMB_DRIVE_DISABLE_S6}
000011F2  2          IF CONFIGURATION.RUN_AT_EXEC = TRUE THEN
000011FE  2               SEMANTIC_ERROR := 13
00001208  2          ELSE IF NOT CONFIGURATION.REAL_TIME THEN
00001210  2               SEMANTIC_ERROR := 41
0000121A  2          ELSE BEGIN
0000121A  2               TURN_OFF_IMB;
0000121E  2               DEFINE_IMB(1,+1,RETURN_CODE);      {receive master_enable}
00001232  2               DEFINE_IMB(0,-3,RETURN_CODE);      {drive storage_enable off}
00001244  2               DEFINE_IMB(0,-4,RETURN_CODE);      {drive trigger off}
00001256  2               DEFINE_IMB(0,+2,RETURN_CODE);      {drive trigger_enable}
00001268  2               IF RETURN_CODE < 0 THEN
00001270  2                    GENERAL_MESSAGE(40,Warning);
00001280  2               CONFIGURATION.DISABLE_IMB.DRIVE := TRIGGER_ENABLE;
00001286  2               IF MEAS_SETUP[STOP_ON].CMD = NIL THEN
0000128E  2                    GENERAL_MESSAGE(49,Warning);
0000129E  2               END;
0000129E  2          END;
000012A2  2
000012A2  2          {<at_execution> ::= }
000012A2  2        174
000012A2  2        : BEGIN              {AT_EXEC_FALSE_S6}
000012A2  2          BOOL_TEMP := FALSE;
000012A6  2          END;
000012AA  2
000012AA  2          {<at_execution> ::= at_execution}
000012AA  2        175
000012AA  2        : BEGIN              {AT_EXEC_TRUE_S6}
000012AA  2          IF NOT NO_IMB THEN
000012B2  2               SEMANTIC_ERROR := 13
000012BC  2          ELSE BEGIN
000012BC  2               IF CONFIGURATION.REAL_TIME THEN
000012C4  2                    GENERAL_MESSAGE(47,Warning);
000012D4  2               BOOL_TEMP := TRUE;
000012DA  2               END;
```

```
000012DA  2        END;
000012DE  2
000012DE  2        {<execute_from> ::= }
000012DE  2      176
000012DE  2       : BEGIN                 {EXEC_S6}
000012DE  2        CONFIGURATION.RUN_CMD := FROM_PC;
000012E2  2        ADD_TO_STACK(SPEC_STACK_PTR,SPEC_OPERAND,SPEC_OP_PC,INTEGER(I),VECTOR0_7(I));
00001306  2        END;
0000130A  2
0000130A  2        {<execute_from> ::= from transfer_address}
0000130A  2      177
0000130A  2       : BEGIN                 {EXEC_TRANS_S6}
0000130A  2        CONFIGURATION.RUN_CMD := FROM_XFER;
00001310  2        ADD_TO_STACK(SPEC_STACK_PTR,SPEC_OPERAND,SPEC_OP_TA,INTEGER(I),VECTOR0_7(I));
00001334  2        END;
00001338  2
00001338  2        {<execute_from> ::= from line <line_desc>}
00001338  2      178
00001338  2       : BEGIN                 {EXEC_LINE_S6}
00001338  2        CONFIGURATION.RUN_CMD := FROM_ADRS;
0000133E  2        END;
00001342  2
00001342  2        {<execute_from> ::= from module <module_desc>}
00001342  2      179
00001342  2       : BEGIN                 {EXEC_MOD_S6}
00001342  2        CONFIGURATION.RUN_CMD := FROM_ADRS;
00001348  2        END;
0000134C  2
0000134C  2        {<execute_from> ::= from address <value_expression>}
0000134C  2      180
0000134C  2       : BEGIN                 {EXEC_ADD_S6}
0000134C  2        CONFIGURATION.RUN_CMD := FROM_ADRS;
00001352  2        END;
00001356  2
00001356  2        {<address> ::= address}
00001356  2      181
00001356  2       : BEGIN                 {ADDRESS_S6}
00001356  2        ADD_TO_STACK(SPEC_STACK_PTR,SPEC_ADDRESS,I,INTEGER(APPLY_STACK^.VALUE),VECTOR0_7(I));
0000137A  2        END;
0000137E  2
0000137E  2        {<protected> ::= empty}
0000137E  2      193
0000137E  2       : BEGIN                 {PROTECT_FALSE_S6}
0000137E  2        PROTECTED := INT(FALSE);
00001382  2        END;
00001386  2
00001386  2        {<protected> ::= write_protected}
00001386  2      194
00001386  2       : BEGIN                 {PROTECT_TRUE_S6}
00001386  2        PROTECTED := INT(TRUE);
0000138C  2        END;
00001390  2
00001390  2        {<file_name> ::= file_name}
00001390  2      195
00001390  2       : BEGIN                 {FILE_NAME_S6}
00001390  2        FILE_NAME := APPLY_STACK^.IDENT;
000013A4  2        FILE_DISC := APPLY_STACK^.DISC;
000013AE  2        END;
000013B2  2
000013B2  2        {<variable> ::= * <the_variable>}
000013B2  2      215
000013B2  2       : BEGIN                 {C_VARIABLE_S6}
000013B2  2        ADD_TO_STACK(SPEC_STACK_PTR,SPEC_PTR,SPEC_OP_ST,INTEGER(I),VECTOR0_7(I));
000013D4  2        ADD_TO_STACK(SPEC_STACK_PTR,SPEC_VEND,I,INTEGER(I),VECTOR0_7(I));
000013F8  2        END;
000013FC  2
000013FC  2        {<the_variable> ::= <variable_identifier>}
000013FC  2      206,211,212,213,214
000013FC  2       : BEGIN                 {VARIABLE_S6}
000013FC  2        ADD_TO_STACK(SPEC_STACK_PTR,SPEC_VEND,I,INTEGER(I),VECTOR0_7(I));
00001420  2        SYMBOL_COUNT := SYMBOL_COUNT + 1;
00001424  2        IF SYMBOL_COUNT > 10 THEN
00001430  2             SEMANTIC_ERROR := 7;
00001436  2        END;
0000143A  2
```

```
0000143A  2          {<pascal_ptr> ::= ^}
0000143A  2         229
0000143A  2          : BEGIN                 {PASCAL_PTR_S6}
0000143A  2           ADD_TO_STACK(SPEC_STACK_PTR,SPEC_PTR,SPEC_OP_UP,INTEGER(I),VECTOR0_7(I));
0000145C  2           END;
00001460  2
00001460  2          {<c_ptr> ::= ->}
00001460  2         230
00001460  2          : BEGIN                 {C_PTR_S6}
00001460  2           ADD_TO_STACK(SPEC_STACK_PTR,SPEC_PTR,SPEC_OP_PO,INTEGER(I),VECTOR0_7(I));
00001482  2           END;
00001486  2
00001486  2          {<c_ptr> ::= *}
00001486  2         231
00001486  2          : BEGIN                 {C_STAR_S6}
00001486  2           ADD_TO_STACK(SPEC_STACK_PTR,SPEC_PTR,SPEC_OP_FS,INTEGER(I),VECTOR0_7(I));
000014A8  2           END;
000014AC  2
000014AC  2          {<variable_identifier> ::= variable_identifier}
000014AC  2          {<var_ident_ptr> ::= var_ident_ptr}
000014AC  2         234,235,236,237
000014AC  2          : BEGIN                 {VAR_IDENT_S6}
000014AC  2           ADD_TO_STACK(SPEC_STACK_PTR,SPEC_IDENT,I,INTEGER(I),APPLY_STACK^.IDENT);
000014D4  2           END;
000014D8  2
000014D8  2          {<index> ::= index_integer}
000014D8  2          {<index> ::= + index_integer}
000014D8  2         238,239
000014D8  2          : BEGIN                 {P_INDEX_S6}
000014D8  2           ADD_TO_STACK(SPEC_STACK_PTR,SPEC_INDEX,I,INTEGER(APPLY_STACK^.VALUE),VECTOR0_7(I));
000014FC  2           END;
00001500  2
00001500  2          {<index> ::= - index_integer}
00001500  2         240
00001500  2          : BEGIN                 {N_INDEX_S6}
00001500  2           ADD_TO_STACK(SPEC_STACK_PTR,SPEC_INDEX,I,- INTEGER(APPLY_STACK^.VALUE),VECTOR0_7(I));
00001528  2           END;
0000152C  2
0000152C  2          {<index> ::= scalar_identifier}
0000152C  2         241,242
0000152C  2          : BEGIN                 {S_INDEX_S6}
0000152C  2           ADD_TO_STACK(SPEC_STACK_PTR,SPEC_SCALAR,I,INTEGER(I),APPLY_STACK^.IDENT);
00001554  2           END;
00001558  2
00001558  2          {[<path>] ::= <empty>}
00001558  2         243
00001558  2          : BEGIN                 {NO_PATH_S6}
00001558  2           IF DEFAULT_FILE[0] = 0020H THEN
00001564  2                SEMANTIC_ERROR := 14
0000156E  2           ELSE BEGIN
0000156E  2  { BUG FIX !    IF (DEFAULT_PROC[0] + ERROR - ERROR) <> -1 THEN  (*******}
0000156E  2                IF DEFAULT_PROC[0] <> 0020H THEN
0000157A  2                     ADD_TO_STACK(SPEC_STACK_PTR,SPEC_PROC,I,INTEGER(I),DEFAULT_PROC)
000015A2  2                ELSE
000015A2  2                     PROCEDURE_NUM := 0;
000015A6  2                ADD_TO_STACK(SPEC_STACK_PTR,SPEC_FILE,DEFAULT_DISC,INTEGER(I),DEFAULT_FILE);
000015CA  2                END;
000015CA  2           END;
000015CE  2
000015CE  2          {[<path>] ::= <module_path>}
000015CE  2         244
000015CE  2          : BEGIN                 {PATH_MOD_S6}
000015CE  2           IF DEFAULT_FILE[0] = 0020H THEN
000015DA  2                SEMANTIC_ERROR := 14
000015E4  2           ELSE BEGIN
000015E4  2                ADD_TO_STACK(SPEC_STACK_PTR,SPEC_PROC,I,INTEGER(I),PROC_IDENT);
00001608  2                ADD_TO_STACK(SPEC_STACK_PTR,SPEC_FILE,DEFAULT_DISC,INTEGER(I),DEFAULT_FILE);
0000162C  2                END;
0000162C  2           END;
00001630  2
00001630  2          {[<path>] ::= <module_path> <file_path>}
00001630  2         245
00001630  2          : BEGIN                 {PATH_S6}
00001630  2           ADD_TO_STACK(SPEC_STACK_PTR,SPEC_PROC,I,INTEGER(I),PROC_IDENT);
```

```
00001654  2           ADD_TO_STACK(SPEC_STACK_PTR,SPEC_FILE,FILE_DISC,INTEGER(I),FILE_NAME);
00001678  2           END;
0000167C  2
0000167C  2           {I<path>] ::= <file_path>}
0000167C  2         246
0000167C  2          : BEGIN                {PATH_FILE_S6}
0000167C  2           ADD_TO_STACK(SPEC_STACK_PTR,SPEC_FILE,FILE_DISC,INTEGER(I),FILE_NAME);
000016A0  2           END;
000016A4  2
000016A4  2           {I<part_path>] ::= <empty>}
000016A4  2         247
000016A4  2          : BEGIN                {NO_PART_PATH_S6}
000016A4  2           IF DEFAULT_FILE[0] = 0020H THEN
000016B0  2                SEMANTIC_ERROR := 14
000016BA  2           ELSE
000016BA  2                BEGIN
000016BA  2                ADD_TO_STACK(SPEC_STACK_PTR,SPEC_OPERAND,SPEC_OP_DP,INTEGER(I),VECTOR0_7(I));
000016DE  2                ADD_TO_STACK(SPEC_STACK_PTR,SPEC_FILE,DEFAULT_DISC,INTEGER(I),DEFAULT_FILE);
00001702  2                END;
00001702  2           END;
00001706  2
00001706  2           {I<part_path>] ::= <file_path>}
00001706  2         248
00001706  2          : BEGIN                {PART_PATH_S6}
00001706  2           ADD_TO_STACK(SPEC_STACK_PTR,SPEC_FILE,FILE_DISC,INTEGER(I),FILE_NAME);
0000172A  2           END;
0000172E  2
0000172E  2           {<module_path_name> ::= module_path_name}
0000172E  2         251,252
0000172E  2          : BEGIN                {MOD_PATH_IDENT_S6}
0000172E  2           PROC_IDENT := APPLY_STACK^.IDENT;
00001742  2           END;
00001746  2
00001746  2  {*********************************************************************}
00001746  2  {*      {<block_path_integer> ::= block_path_integer}              *}
00001746  2  {*    209                                                          *}
00001746  2  {*     : BEGIN                {LINE_PATH_NUM_S6}                  *}
00001746  2  {*      NUM := APPLY_STACK^.VALUE.LSW;                             *}
00001746  2  {*      END;                                                       *}
00001746  2  {*********************************************************************}
00001746  2
00001746  2           {<file_path_name> ::= file_path_name}
00001746  2         255
00001746  2          : BEGIN                {FILE_PATH_IDENT_S6}
00001746  2           FILE_NAME := APPLY_STACK^.IDENT;
0000175A  2           FILE_DISC := APPLY_STACK^.DISC;
00001764  2           END;
00001768  2
00001768  2      OTHERWISE ; {no error trap}
00001768  2      END;                              {END_OF_CASE_STATEMENT}
00001956  2  END;
00000000  1  .
```

End of compilation, number of errors=    0

```
00000000  1  "68000" PREPROCESS
00000000  1  $BASE_PAGES
00000000  1  $WIDTH 120$
00000000  1
00000000  1  PROGRAM REAL_APPLY_;
00000000  1
00000000  1  $EXTENSIONS ON$
00000000  1  $LIB_ABS_LONG$
00000000  1  $WARN OFF$
00000000  1
00000000  1  CONST
00000000  1      MONITOR_PRI = -50;        { <==================================== }
00000000  1
00000000  1  TYPE
00000000  1      SOB = SET OF 0..15;
00000000  1      INT = SIGNED_16;
00000000  1      PTR = ^ INTEGER;
00000000  1      INT_PTR = ^ INT;
00000000  1      VECTOR0_7 = ARRAY[0..7] OF INT;
00000000  1      FMGRNAME = ARRAY[0..7] OF INT;
```

```
00000000 1      DOUBLE_WORD = RECORD
00000000 2                 MSW : INT;
00000000 2                 LSW : INT;
00000000 1                 END;
00000000 1      COMPLEX_TYPE = RECORD
00000000 2                 VALUE : DOUBLE_WORD;
00000000 2                 MASK : DOUBLE_WORD;
00000000 1                 END;
00000000 1  #INCLUDE ICDS_68K:SODAME
00000000 1  #INCLUDE IAPPLY_68K:SODAMES
00000000 1  #INCLUDE ICMD_DATA:SODAMON
00000000 1  #INCLUDE ISPEC_DATA:SODAMON
00000000 1  #INCLUDE ICHILDREN:SODAMON
00000000 1  #INCLUDE IDISPLAY:SODAMON
00000000 1  #INCLUDE INCLUDE:KIP
00000000 1  #INCLUDE IG_AREA:SODARU
00000000 1
00000000 1  VAR
00000000 1  $EXTVAR+$
00000000 1  $FAR$
00000000 1     printer_HP : VECTORO_7;
00000000 1  $BASE_PAGE$
00000000 1     CDS : CDS_TYPE;
00000000 1     APPLY_STACK : A_TOKEN_PTR;
00000000 1     MEAS_SETUP : CMD_ARRAY;
00000000 1     PARM_REC : PARAMETER_TYPE;
00000000 1     DEFAULT_FORMATS : ARRAY[0..2] OF FMT_PTR;
00000000 1     CURRENT_FORMATS : ARRAY[0..2] OF FMT_PTR;
00000000 1     DISPLAY_MASTER : DISPLAY_SPEC;
00000000 1     TEMP_FORMAT : FMT;
00000000 1     CURRENT_DISPLAY : INT;
00000000 1     FILE_NAME : VECTORO_7;
00000000 1     FILE_DISC : INT;
00000000 1     FILE_DCB : INT;
00000000 1     CONFIGURATION : CONFIG_REC_TYPE;
00000000 1     MEASUREMENT_TYPE : INT;
00000000 1     MEAS_DISP_TYPE : INT;
00000000 1     DEBUG : DEBUG_TYPE;
00000000 1     DISPLAY : DISPLAY_TYPE;
00000000 1     SOURCE_DCB : INT;
00000000 1     SOURCE_UP : INT;
00000000 1     VALID_FOOTDC : BOOLEAN;     { debug for kip }
00000000 1     G_AREA : INT;
00000000 1  $EXTVAR-$
00000000 1     NUM : DOUBLE_WORD;
00000004 1     LIST_FILE : VECTORO_7;
00000014 1     LIST_DISC : INT;
00000016 1     LIST_DCB : INT;
00000018 1     APPEND_FLAG : BOOLEAN;
0000001A 1     FMGR_CODE : INT;
0000001C 1
0000001C 1  $CALL_ABS_LONG ON$
00000000 1  PROCEDURE GENERAL_MESSAGE(MESS_NUM : INT; MESSAGE : MESSAGE_TYPES); EXTERNAL;
00000000 1  PROCEDURE CHECK_POOL; EXTERNAL;
00000000 1  PROCEDURE BPC_WRITE (ADDR_68K : PTR; ADDR_BPC : INT; LENGTH : INT); EXTERNAL;
00000000 1  PROCEDURE P_CLOSE (VAR DCB : INT; VAR FMGR_CODE : INT); EXTERNAL;
00000000 1  PROCEDURE P_FILE_ERR (VAR DCB : INT; FMGR_CODE : INT); EXTERNAL;
00000000 1  PROCEDURE OUTIT(L:CHAR;V:INT;B:CHAR);EXTERNAL;
00000000 1  PROCEDURE APPLY_RESET; EXTERNAL;
00000000 1  PROCEDURE O_APPLY_BREAK; EXTERNAL;
00000000 1  PROCEDURE CLOSE_DD_FILES; EXTERNAL;
00000000 1  PROCEDURE SLEEP_ (CHAN : INTEGER; PRI : INT); EXTERNAL;
00000000 1  PROCEDURE WAKEUP_ (CHAN : INTEGER); EXTERNAL;
00000000 1  PROCEDURE EMUL_MSG(STACK_MSG : BOOLEAN); EXTERNAL;
00000000 1  PROCEDURE STATIC_CONTROLLER; EXTERNAL;
00000000 1  PROCEDURE KILL_DISPLAY; EXTERNAL;
00000000 1  PROCEDURE MODIFY_DISPLAY; EXTERNAL;
00000000 1  PROCEDURE MODIFY_MEASUREMENT; EXTERNAL;
00000000 1  PROCEDURE MODIFY_ENABLE; EXTERNAL;
00000000 1  PROCEDURE MODIFY_DISABLE; EXTERNAL;
00000000 1  $CALL_PC_SHORT ON$
00000000 1  PROCEDURE POP_SINGLE(VAR VALUE : INT); EXTERNAL;
00000000 1  PROCEDURE POP_DOUBLE(VAR VALUE : DOUBLE_WORD); EXTERNAL;
00000000 1  PROCEDURE MODIFY_BYTE(A_BYTE_PTR : INTEGER; NUM : BYTE); EXTERNAL;
00000000 1  PROCEDURE MODIFY_WORD(A_WORD_PTR : INTEGER; NUM : INT); EXTERNAL;
```

```
00000000 1 PROCEDURE MODIFY_LONG(A_LONG_PTR : INTEGER; NUM : DOUBLE_WORD); EXTERNAL;
00000000 1 PROCEDURE MODIFY_BLOCK(A_WORD_PTR : INTEGER; NUM : INT); EXTERNAL;
00000000 1 PROCEDURE EXAMINE_BYTE(A_BYTE_PTR : INTEGER); EXTERNAL;
00000000 1 PROCEDURE EXAMINE_WORD(A_WORD_PTR : INTEGER); EXTERNAL;
00000000 1 PROCEDURE EXAMINE_LONG(A_LONG_PTR : INTEGER); EXTERNAL;
00000000 1 PROCEDURE EXAMINE_BLOCK(A_WORD_PTR : INTEGER); EXTERNAL;
00000000 1 PROCEDURE DISPLAY_SOMETHING(DISPLAY : INT; COPY : BOOLEAN); EXTERNAL;
00000000 1 FUNCTION  OPEN_LISTFILE(APPEND : BOOLEAN) : INT; EXTERNAL;
00000000 1
00000000 1 {*********************************}
00000000 1 { this is temporary for kip     }
00000000 1 PROCEDURE KILL_DYNAMIC; EXTERNAL;
00000000 1 {*********************************}
00000000 1
00000000 1 $GLOBPROC+$
00000000 1
00000000 1 PROCEDURE REAL_APPLY(STATE:INT);
00000000 2 VAR
00000000 2     TEMP : INTEGER;
00000004 2     STEMP : INT;
00000004 2 BEGIN
00000004 2 CASE STATE OF                   {START_OF_CASE_STATEMENT}
0000000E 2
0000000E 2           {<measurement_request> ::= _!_}
0000000E 2          6
0000000E 2         : BEGIN                {BLANK_LINE_R6}
0000000E 2           DISPLAY.VERTICAL := 0;
00000012 2           DISPLAY.COMMAND := LEFT_JUSTIFY;
00000018 2           END;
0000001C 2
0000001C 2           {<command> ::= halt}
0000001C 2          7
0000001C 2         : BEGIN                {HALT_R6}
0000001C 2          END;
00000020 2
00000020 2           {<command> ::= reset}
00000020 2          64
00000020 2         : BEGIN                {RESET_R6}
00000020 2           APPLY_RESET;
00000026 2           END;
0000002A 2
0000002A 2           {<command> ::= end}
0000002A 2           {<command> := configuration load_from <file_name>}
0000002A 2          8, 77
0000002A 2         : BEGIN                {END_R6}
0000002A 2           STEMP := CURRENT_DISPLAY,
00000030 2           KILL_DISPLAY;
00000036 2           CURRENT_DISPLAY := STEMP;
0000003C 2           CLOSE_DB_FILES;
00000042 2           IF SOURCE_UP = 1 THEN
0000004E 2                BEGIN
0000004E 2                P_CLOSE(SOURCE_DCB,FMGR_CODE);
0000005E 2                SOURCE_UP := 0;
00000062 2                END;
00000062 2           WHILE CDS.REQUEST_TYPE <> INT(EMPTY) DO
0000006E 2                SLEEP_(1,MONITOR_PRI);
00000082 2           CDS.REQUEST_TYPE := INT(NO_MESSAGE);
00000086 2           END;
0000008A 2
0000008A 2           {<command> ::= modify byte <byte_address> with_data <data>}
0000008A 2          17
0000008A 2         : BEGIN                {MODIFY_BYTE_R6}
0000008A 2           POP_DOUBLE(DOUBLE_WORD(TEMP));
00000094 2           MODIFY_BYTE(TEMP,BYTE(NUM.LSW));
000000A4 2           END;
000000A8 2
000000A8 2           {<command> ::= modify word <byte_address> with_data <data>}
000000A8 2          18
000000A8 2         : BEGIN                {MODIFY_WORD_R6}
000000A8 2           POP_DOUBLE(DOUBLE_WORD(TEMP));
000000B2 2           MODIFY_WORD(TEMP,NUM.LSW);
000000C0 2           END;
000000C4 2
000000C4 2           {<command> ::= modify long <byte_address> with_data <data>}
```

```
000000C4  2        19
000000C4  2        : BEGIN                 (MODIFY_LONG_R6)
000000C4  2          POP_DOUBLE(DOUBLE_WORD(TEMP));
000000CE  2          MODIFY_LONG(TEMP,NUM);
000000DC  2          END;
000000E0  2
000000E0  2          (<command> ::= modify block <byte_address> with_data <data>)
000000E0  2        20
000000E0  2        : BEGIN                 (MODIFY_BLOCK_R6)
000000E0  2          POP_DOUBLE(DOUBLE_WORD(TEMP));
000000EA  2          MODIFY_BLOCK(TEMP,NUM.LSW);
000000F8  2          END;
000000FC  2
000000FC  2          (<command> ::= examine byte <byte_address>)
000000FC  2        21
000000FC  2        : BEGIN                 (EXAMINE_BYTE_R6)
000000FC  2          POP_DOUBLE(DOUBLE_WORD(TEMP));
00000106  2          EXAMINE_BYTE(TEMP);
00000110  2          END;
00000114  2
00000114  2          (<command> ::= examine word <byte_address>)
00000114  2        22
00000114  2        : BEGIN                 (EXAMINE_WORD_R6)
00000114  2          POP_DOUBLE(DOUBLE_WORD(TEMP));
0000011E  2          EXAMINE_WORD(TEMP);
00000128  2          END;
0000012C  2
0000012C  2          (<command> ::= examine long <byte_address>)
0000012C  2        23
0000012C  2        : BEGIN                 (EXAMINE_LONG_R6)
0000012C  2          POP_DOUBLE(DOUBLE_WORD(TEMP));
00000136  2          EXAMINE_LONG(TEMP);
00000140  2          END;
00000144  2
00000144  2          (<command> ::= examine block <byte_address>)
00000144  2        24
00000144  2        : BEGIN                 (EXAMINE_BLOCK_R6)
00000144  2          POP_DOUBLE(DOUBLE_WORD(TEMP));
0000014E  2          EXAMINE_BLOCK(TEMP);
00000158  2          END;
0000015C  2
0000015C  2          (<data> ::= data)
0000015C  2        28
0000015C  2        : BEGIN                 (DATA_R6)
0000015C  2          NUM := APPLY_STACK^.VALUE;
00000166  2          END;
0000016A  2
0000016A  2          (<command> ::= setup count statements <statement_type>)
0000016A  2        37
0000016A  2        : BEGIN                 (CT_STATE_R6)
0000016A  2          CONFIGURATION.COUNT_TIME := FALSE;      (force to count state)
0000016E  2          END;
00000172  2
00000172  2          (<command> ::= setup time modules <modules_type>)
00000172  2        38
00000172  2        : BEGIN                 (TI_MOD_R6)
00000172  2          CONFIGURATION.COUNT_TIME := TRUE;      (force to count time)
00000178  2          END;
0000017C  2
0000017C  2          (<command> ::= break off)
0000017C  2        40
0000017C  2        : BEGIN                 (BREAK_OFF_R6)
0000017C  2          CONFIGURATION.BREAK_MEAS_COMP := FALSE;
00000180  2          CURRENT_DISPLAY := Setup;
00000186  2          END;
0000018A  2
0000018A  2          (<command> ::= break on measurement_complete)
0000018A  2        41
0000018A  2        : BEGIN                 (BREAK_ON_R6)
0000018A  2          CONFIGURATION.BREAK_MEAS_COMP := TRUE;
00000190  2          CURRENT_DISPLAY := Setup;
00000196  2          END;
```

```
0000019A  2
0000019A  2            {<command> ::= modify measurement}
0000019A  2           42
0000019A  2           : BEGIN                    {MODIFY_MEASUREMENT_R6}
0000019A  2             MODIFY_MEASUREMENT;
000001A0  2             END;
000001A4  2
000001A4  2            {<command> ::= modify measurement_enable}
000001A4  2           43
000001A4  2           : BEGIN                    {MODIFY_ENABLE_R6}
000001A4  2             MODIFY_ENABLE;
000001AA  2             END;
000001AE  2
000001AE  2            {<command> ::= modify measurement_disable}
000001AE  2           44
000001AE  2           : BEGIN                    {MODIFY_DISABLE_R6}
000001AE  2             MODIFY_DISABLE;
000001B4  2             END;
000001B8  2
000001B8  2            {<command> ::= <condition_opt>}
000001B8  2            {<command> ::= <configuration_opt>}
000001B8  2           45, 46
000001B8  2           : BEGIN                    {SHOW_CON_R6}
000001B8  2             CURRENT_DISPLAY := Setup;
000001BE  2             END;
000001C2  2
000001C2  2            {<command> ::= modify <variable> = <value>}
000001C2  2           47, 48
000001C2  2           : BEGIN                    {MODIFY_VAR_R6}
000001C2  2             STATIC_CONTROLLER;
000001C8  2             END;
000001CC  2
000001CC  2            {<command> ::= display <variable>}
000001CC  2           49
000001CC  2           : BEGIN                    {DISPLAY_VAR_R6}
000001CC  2             STATIC_CONTROLLER;
000001D2  2             END;
000001D6  2
000001D6  2            {<command> ::= show measurment}
000001D6  2           50
000001D6  2           : BEGIN                    {SHOW_MEAS_R6}
000001D6  2             CURRENT_DISPLAY := Measurement;
000001DC  2             DISPLAY.COMMAND := REFORMAT;
000001E2  2             END;
000001E6  2
000001E6  2            {<command> ::= show setup}
000001E6  2           51
000001E6  2           : BEGIN                    {SHOW_SETUP_R6}
000001E6  2             CURRENT_DISPLAY := Setup;
000001EC  2             EMUL_MSG(FALSE);
000001F6  2             END;
000001FA  2
000001FA  2            {<command> ::= show source}
000001FA  2            {<command> ::= show source <file name>}
000001FA  2           52, 53
000001FA  2           : BEGIN                    {SHOW_SOURCE_R6}
000001FA  2             CURRENT_DISPLAY := Source;
00000200  2             END;
00000204  2
00000204  2            {<command> ::= show debug <command_type> <stack_type>}
00000204  2           54
00000204  2           : BEGIN                    {SHOW_DEBUG_R6}
00000204  2             CURRENT_DISPLAY := Debug;
0000020A  2             END;
0000020E  2
0000020E  2            {<command> ::= show symbol <show_variable>}
0000020E  2           55
0000020E  2           : BEGIN                    {SHOW_SYMBOL_R6}
0000020E  2             CURRENT_DISPLAY := Symbol;
00000214  2             END;
00000218  2
00000218  2            {<command> ::= show revision}
00000218  2           56
00000218  2           : BEGIN                    {SHOW_REVISION_R6}
```

```
00000218  2            GENERAL_MESSAGE(61,Status);
00000226  2            END;
0000022A  2
0000022A  2            {<command> ::= display default}
0000022A  2           57
0000022A  2           : BEGIN                {SHOW_MEAS_DEF_R6}
0000022A  2  {         CURRENT_DISPLAY := Measurement;        don't switch displays}
0000022A  2            CURRENT_FORMATS[MEAS_DISP_TYPE]^ := DEFAULT_FORMATS[MEAS_DISP_TYPE]^;
0000024E  2            DISPLAY.COMMAND := REFORMAT;
00000254  2            END;
00000258  2
00000258  2            {<command> ::= display modify}
00000258  2           58
00000258  2           : BEGIN                    {DISPLAY_MODIFY_R6}
00000258  2            MODIFY_DISPLAY;
0000025E  2            END;
00000262  2
00000262  2            {<command> ::= display <display_list>}
00000262  2           60
00000262  2           : BEGIN                    {SHOW_MEAS_LIST_R6}
00000262  2  {         CURRENT_DISPLAY := Measurement;        don't switch displays}
00000262  2            DISPLAY.COMMAND := REFORMAT;
00000268  2            CURRENT_FORMATS[MEAS_DISP_TYPE]^ := TEMP_FORMAT;
00000282  2            END;
00000286  2
00000286  2            {<command> ::= <integer>}
00000286  2           61
00000286  2           : BEGIN                {DISP_LINE_R6}
00000286  2            DISPLAY_MASTER.LOCATION := NUM.LSW;
0000028C  2            DISPLAY.COMMAND := POSITION;
00000292  2            DISPLAY.POSITION := NUM.LSW;
00000298  2            END;
0000029C  2
0000029C  2            {<command> ::= run ...}
0000029C  2           68
0000029C  2           : BEGIN                    {RUN_R6}
0000029C  2  {         IF NOT CONFIGURATION.RUN_AT_EXEC THEN                    }
0000029C  2  {              BEGIN                                                }
0000029C  2  {              IF MEAS_SETUP[EXECUTION].MARK <> NIL THEN            }
0000029C  2  {                   RELEASE(MEAS_SETUP[EXECUTION].MARK);            }
0000029C  2  {              MEAS_SETUP[EXECUTION].CMD := NIL;                    }
0000029C  2  {              MEAS_SETUP[EXECUTION].SPEC := NIL;                   }
0000029C  2  {              MEAS_SETUP[EXECUTION].MARK := NIL;                   }
0000029C  2  {              END;                                                 }
0000029C  2            END;
000002A0  2
000002A0  2            {<command> ::= run at_executeion off}
000002A0  2           69
000002A0  2           : BEGIN                {RUN_OFF_R6}
000002A0  2            CONFIGURATION.RUN_AT_EXEC := FALSE;
000002A4  2            END;
000002A8  2
000002A8  2            {<command> ::= break}
000002A8  2           70
000002A8  2           : BEGIN                    {BREAK_R6}
000002AC  2            D_APPLY_BREAK;
000002AE  2            END;
000002B2  2
000002B2  2            {<command> ::= copy measurement <copy_limits> to <listfile_desc>}
000002B2  2           71
000002B2  2           : BEGIN                    {COPY_MEAS_R6}
000002B2  2            DISPLAY_MASTER.LISTFILE_NAME := FMGRNAME(FILE_NAME);
000002C2  2            DISPLAY_MASTER.LISTFILE_DISC := FILE_DISC,
000002C8  2            DISPLAY_SOMETHING(Measurement,TRUE);
000002D6  2            END;
000002DA  2
000002DA  2            {<command> ::= copy setup to <listfile_desc>}
000002DA  2           72
000002DA  2           : BEGIN                    {COPY_SETUP_R6}
000002DA  2            FMGR_CODE := OPEN_LISTFILE(APPEND_FLAG);
000002E8  2            IF FMGR_CODE = 0 THEN
000002F0  2                 DISPLAY_SOMETHING(Setup,TRUE);
000002FE  2            P_CLOSE(FILE_DCB,FMGR_CODE);
0000030E  2            END;
```

```
00000312  2
00000312  2      {<command> ::= copy display to <listfile_desc>}
00000312  2     73
00000312  2     : BEGIN              {COPY_DISPLAY_R6}
00000312  2       FMGR_CODE := OPEN_LISTFILE(APPEND_FLAG);
00000320  2       IF FMGR_CODE = 0 THEN
00000328  2            DISPLAY_SOMETHING(Display,TRUE);
00000334  2       P_CLOSE(FILE_DCB,FMGR_CODE);
00000344  2       END;
00000348  2
00000348  2      {<command> ::= copy symbol <show_variable> to <listfile_desc>}
00000348  2     74
00000348  2     : BEGIN              {COPY_SYMBOL_R6}
00000348  2       FMGR_CODE := OPEN_LISTFILE(APPEND_FLAG);
00000356  2       IF FMGR_CODE = 0 THEN
0000035E  2            DISPLAY_SOMETHING(Symbol,TRUE);
0000036C  2       P_CLOSE(FILE_DCB,FMGR_CODE);
0000037C  2       END;
00000380  2
00000380  2      {<command> ::= copy debug <command_type> <stack_type> to <listfile_desc>}
00000380  2     75
00000380  2     : BEGIN              {COPY_DEBUG_R6}
00000380  2       FMGR_CODE := OPEN_LISTFILE(APPEND_FLAG);
0000038E  2       IF FMGR_CODE = 0 THEN
00000396  2            DISPLAY_SOMETHING(Debug,TRUE);
000003A4  2       P_CLOSE(FILE_DCB,FMGR_CODE);
000003B4  2       END;
000003B8  2
000003B8  2      {<command> ::= database_check <db_listfile>}
000003B8  2     79, 80
000003B8  2     : BEGIN              {DB_CHECK_R6}
000003B8  2       IF SOURCE_UP = 1 THEN
000003C4  2            BEGIN
000003C4  2            P_CLOSE(SOURCE_DCB,FMGR_CODE);
000003D4  2            SOURCE_UP := 0;
000003D8  2            END;
000003D8  2       DISPLAY.HOLD_DISPLAY := TRUE;
000003DE  2       END;
000003E2  2
000003E2  2      {<command> ::= debug type <INTEGER>}
000003E2  2     81
000003E2  2     : BEGIN              {DEBUG_TYPE_R6}
000003E2  2       CASE NUM.LSW OF
000003EC  2            0 : BEGIN
000003EC  2                { this is temporary for kip     }
000003EC  2                KILL_DYNAMIC;
000003F0  2                KILL_DISPLAY;
000003F6  2                DISPLAY_MASTER.DUMMY := TRUE;
000003FC  2                DISPLAY_MASTER.CURRENT_FORMAT := CURRENT_FORMATS[0];
00000402  2                MEASUREMENT_TYPE := INT(TR_VAR);
00000406  2                MEAS_DISP_TYPE := INT(TR_VAR);
0000040A  2                CURRENT_DISPLAY := Measurement;
00000410  2                VALID_FOOTDC := TRUE;
00000416  2                END;
0000041A  2            1 : BEGIN
0000041A  2                { BPC QA_FLAG := TRUE; }
0000041A  2                END;
0000041E  2            2 : BEGIN
0000041E  2                { BPC QA_FLAG := FALSE; }
0000041E  2                END;
00000422  2            100 : BEGIN
00000422  2                CURRENT_DISPLAY := Symbol;
00000428  2                END;
0000042C  2            101 : BEGIN
0000042C  2                CHECK_POOL;
00000432  2                END;
00000436  2            OTHERWISE ; {no error trap}
00000436  2            END;
0000045A  2       END;
0000045E  2
0000045E  2      {<command> ::= setup disable off}
0000045E  2     84
0000045E  2     : BEGIN              {DISABLE_OFF_R6}
0000045E  2       CONFIGURATION.WINDOW := FALSE;
00000462  2       END;
```

```
00000466  2
00000466  2        {[<window>] ::= empty}
00000466  2       86
00000466  2        : BEGIN                  {NO_WINDOW_R6}
00000466  2          CONFIGURATION.WINDOW := FALSE;
0000046A  2          END;
0000046E  2
0000046E  2        {[<window>] ::= window}
0000046E  2       87
0000046E  2        : BEGIN                  {WINDOW_R6}
0000046E  2          CONFIGURATION.WINDOW := TRUE;
00000474  2          END;
00000478  2
00000478  2        {<base> ::= default}
00000478  2       154
00000478  2        : BEGIN                  {NO_BASE_R6}
00000478  2          DISPLAY_MASTER.BASE := DEFAULT;
0000047E  2          DISPLAY.COMMAND := REFORMAT;
00000484  2          END;
00000488  2
00000488  2        {<base> ::= base binary}
00000488  2       155
00000488  2        : BEGIN                  {BINARY_R6}
00000488  2          DISPLAY_MASTER.BASE := BIN;
0000048E  2          DISPLAY.COMMAND := REFORMAT;
00000494  2          END;
00000498  2
00000498  2        {<base> ::= base octal}
00000498  2       156
00000498  2        : BEGIN                  {OCTAL_R6}
00000498  2          DISPLAY_MASTER.BASE := OCT;
0000049E  2          DISPLAY.COMMAND := REFORMAT;
000004A4  2          END;
000004A8  2
000004A8  2        {<base> ::= base decimal}
000004A8  2       157
000004A8  2        : BEGIN                  {DECIMAL_R6}
000004A8  2          DISPLAY_MASTER.BASE := DEC;
000004AE  2          DISPLAY.COMMAND := REFORMAT;
000004B4  2          END;
000004B8  2
000004B8  2        {<base> ::= base hex}
000004B8  2       158
000004B8  2        : BEGIN                  {HEX_R6}
000004B8  2          DISPLAY_MASTER.BASE := HEX;
000004BE  2          DISPLAY.COMMAND := REFORMAT;
000004C4  2          END;
000004C8  2
000004C8  2        {<base> ::= base ascii}
000004C8  2       159
000004C8  2        : BEGIN                  {ASCII_R6}
000004C8  2          DISPLAY_MASTER.BASE := ASCII;
000004CC  2          DISPLAY.COMMAND := REFORMAT;
000004D2  2          END;
000004D6  2
000004D6  2        {<integer> ::= integer}
000004D6  2       160
000004D6  2        : BEGIN                  {INTEGER_R6}
000004D6  2          NUM := APPLY_STACK^.VALUE;
000004E0  2          END;
000004E4  2
000004E4  2        {<configuration_opt> ::= set_counter to_count_state}
000004E4  2       161
000004E4  2        : BEGIN                  {COUNT_STATE_R6}
000004E4  2          CONFIGURATION.COUNT_TIME := FALSE;
000004E8  2          END;
000004EC  2
000004EC  2        {<configuration_opt> ::= set_counter to_count_time}
000004EC  2       162
000004EC  2        : BEGIN                  {COUNT_TIME_R6}
000004EC  2          CONFIGURATION.COUNT_TIME := TRUE;
000004F2  2          END;
000004F6  2
000004F6  2        {<configuration_opt> ::= real_time optional}
```

```
000004F6  2        163
000004F6  2         : BEGIN               {REAL_OPT_R6}
000004F6  2           CONFIGURATION.REAL_TIME := FALSE;
000004FA  2           STEMP := 0;
000004FE  2           BPC_WRITE(PTR(ADDR(STEMP)),G_AREA + REAL_TIME_OFF,1);
0000051A  2           END;
0000051E  2
0000051E  2           {<configuration_opt> ::= real_time required}
0000051E  2        164
0000051E  2         : BEGIN               {REAL_REQ_R6}
0000051E  2           CONFIGURATION.REAL_TIME := TRUE;
00000524  2           STEMP := 1;
0000052A  2           BPC_WRITE(PTR(ADDR(STEMP)),G_AREA + REAL_TIME_OFF,1);
00000546  2           END;
0000054A  2
0000054A  2           {<copy_limits> ::= all}
0000054A  2        182
0000054A  2         : BEGIN               {COPY_ALL_R6}
0000054A  2           DISPLAY.COMMAND := COPYALL;
00000550  2           END;
00000554  2
00000554  2           {<copy_limits> ::= thru start}
00000554  2        183
00000554  2         : BEGIN               {COPY_START_R6}
00000554  2           DISPLAY.COMMAND := COPY;
0000055A  2           DISPLAY_MASTER.LOCATION := -9999;
00000560  2           END;
00000564  2
00000564  2           {<copy_limits> ::= thru end}
00000564  2        184
00000564  2         : BEGIN               {COPY_END_R6}
00000564  2           DISPLAY.COMMAND := COPY;
0000056A  2           DISPLAY_MASTER.LOCATION := +9999;
00000570  2           END;
00000574  2
00000574  2           {<copy_limits> ::= thru <integer>}
00000574  2        185
00000574  2         : BEGIN               {COPY_NUM_R6}
00000574  2           DISPLAY.COMMAND := COPY;
0000057A  2           DISPLAY_MASTER.LOCATION := NUM.LSW;
00000580  2           END;
00000584  2
00000584  2           {<listfile_desc> ::= <file_name>}
00000584  2        186
00000584  2         : BEGIN               {LIST_FILE_R6}
00000584  2           DISPLAY_MASTER.APPEND := APPEND_FLAG;
0000058A  2           END;
0000058E  2
0000058E  2           {<listfile_desc> ::= printer}
0000058E  2        187
0000058E  2         : BEGIN               {LIST_PRINTER_R6}
0000058E  2           APPEND_FLAG := FALSE;
00000592  2           DISPLAY_MASTER.APPEND := APPEND_FLAG;
00000598  2           FILE_NAME := printer_NP;
000005AA  2           FILE_DISC := -1;
000005B0  2           END;
000005B4  2
000005B4  2           {<append> ::= empty}
000005B4  2        191
000005B4  2         : BEGIN               {APPEND_FALSE_R6}
000005B4  2           APPEND_FLAG := FALSE;
000005B8  2           END;
000005BC  2
000005BC  2           {<append> ::= append}
000005BC  2        192
000005BC  2         : BEGIN               {APPEND_TRUE_R6}
000005BC  2           APPEND_FLAG := TRUE;
000005C2  2           END;
000005C6  2
000005C6  2           {<command_type> ::= all}
000005C6  2        196
000005C6  2         : BEGIN               {ALL_STACKS_R6}
000005C6  2           DEBUG.COMMAND := All;
000005CA  2           END;
```

```
000005CE  2
000005CE  2          {<command_type> ::= execution}
000005CE  2        197
000005CE  2         : BEGIN                  {EXECUTE_STACK_R6}
000005CE  2          DEBUG.COMMAND := Execution;
000005D4  2          END;
000005D8  2
000005D8  2          {<command_type> ::= measurement}
000005D8  2        198
000005D8  2         : BEGIN                  {MEASURE_STACK_R6}
000005D8  2          DEBUG.COMMAND := Measurement;
000005DE  2          END;
000005E2  2
000005E2  2          {<command_type> ::= enable}
000005E2  2        199
000005E2  2         : BEGIN                  {ENABLE_STACK_R6}
000005E2  2          DEBUG.COMMAND := Enable;
000005E8  2          END;
000005EC  2
000005EC  2          {<command_type> ::= disable}
000005EC  2        200
000005EC  2         : BEGIN                  {DISABLE_STACK_R6}
000005EC  2          DEBUG.COMMAND := Disable;
000005F2  2          END;
000005F6  2
000005F6  2          {<stack_type> ::= all}
000005F6  2        201
000005F6  2         : BEGIN                  {ALL_TYPES_R6}
000005F6  2          DEBUG.STACK := All;
000005FA  2          END;
000005FE  2
000005FE  2          {<stack_type> ::= command_stack}
000005FE  2        202
000005FE  2         : BEGIN                  {COMMAND_TYPE_R6}
000005FE  2          DEBUG.STACK := Command_stack;
00000604  2          END;
00000608  2
00000608  2          {<stack_type> ::= spec_stack}
00000608  2        203
00000608  2         : BEGIN                  {SPEC_TYPE_R6}
00000608  2          DEBUG.STACK := Spec_stack;
0000060E  2          END;
00000612  2
00000612  2      OTHERWISE ; {no error trap}
00000612  2      END;                        {END_OF_CASE_STATEMENT}
000007BE  2  END;
00000000  1

End of compilation, number of errors=    0
```

```
LOCATION OBJECT CODE LINE     SOURCE LINE

"68000"

*************************************************************************
*                                                                       *
*                    linked at 65000H                                   *
*                                                                       *
*************************************************************************

*************************************************************************
*                                                                       *
*                    entry points                                       *
*                                                                       *
*************************************************************************

*************************************************************************
*                                                                       *
* BUILD_CONTEXT (PC : INTEGER; VAR PROC; PARENTS : CMD_DATA_PTR;        *
*                    VAR ERROR : INT);                                  *
*                                                                       *
* INPUT: 1) PC IS THE PROGRAM COUNTER TO BUILD THE CONTEXT FOR          *
*                                                                       *
* OUTPUT: 1) PROC IS THE PROCEDURE RECORD                               *
*         2) PARENTS IS THE PARENTS ARRAY FOR PROC                      *
*         3) ERROR IS THE ERROR RETURN, 0 = NO ERROR                    *
```

```
                 *                                                                   *
                 ***************************************************************************

                                   GLOBAL BUILD_CONTEXT
000000 60FE      BUILD_CONTEXT     BRA BUILD_CONTEXT
000002                             DS.W 1

                                   END

Errors=    0
                 "68000"

                                   EXTERNAL BUILD_CONTEXT
000000 6000 0000                   BRA BUILD_CONTEXT

                                   END

Errors=    0
                 "68000"
                 *
                 *
                 *   FUNCTION CMP_IDENT(FIRST,SECOND:NAMEPTR):BOOLEAN;
                 *
                 *   THIS FUNCTION COMPARES TWO PISCES IDENTIFIERS AND RETURNS
                 *   AT 0 IF THEY DO NOT MATCH OR A 1 IF THE DO.  A PISCES
                 *   IDENTIFIER IS A STRING WITH THE LENGTH IN WORDS -1 IN
                 *   THE 3 MSD'S OF THE FIRST WORD
                 *
                 *
                           GLD       CMP_IDENT
000000           CMP_IDENT
000000 206F 0008           MOVEA.L   8(A7),A0
000004 226F 0004           MOVEA.L   4(A7),A1
000008 3010                MOVE      (A0),D0           D0 HAS FIRST WORD OF IDENT1
00000A 3211                MOVE      (A1),D1           D1 HAS FIRST WORD OF IDENT2
00000C 363C 000D           MOVE      #13,D3
000010 E668                LSR       D3,D0
000012 E669                LSR       D3,D1
000014 B240                CMP       D0,D1             CHECK LENGTHS
000016 6700 0008           BEQ       COMP_NAME
00001A 3E3C 0000 FALSE     MOVE      #0,D7
00001E 4E75                RTS
000020           COMP_NAME
000020 E340                ASL       #1,D0
000022 5240                ADDQ      #1,D0             D0 HAS NUMBER OF BYTES TO COMPARE
000024 5248                ADDQ      #1,A0
000026 5249                ADDQ      #1,A1
000028 B308      LOOP      CMPM.B    (A0)+,(A1)+       CHECK EACH BYTE OF THE STRINGS
00002A 66EE                BNE       FALSE
00002C 5340                SUBQ      #1,D0
00002E 0C40 0000           CMPI      #0,D0
000032 6700 0000           BEQ       TRUE
000036 4EF9                JMP       LOOP
00003C 3E3C 0001 TRUE      MOVE      #1,D7
000040 4E75                RTS

Errors=    0
```

```
00000000  1  "68000" PREPROCESS
00000000  1  $BASE_PAGES
00000000  1  $WIDTH 120$
00000000  1
00000000  1  PROGRAM COMMAND_;
00000000  1
00000000  1  $EXTENSIONS ON$
00000000  1  $LIB_ABS_LONG$
00000000  1  $WARN OFF$
00000000  1
00000000  1  TYPE
00000000  1      INT = SIGNED_16;
00000000  1      PTR = ^ INTEGER;
00000000  1      VECTOR0_7 = ARRAY[0..7] OF INT;
00000000  1      DOUBLE_WORD = RECORD
00000000  2                 MSW : INT;
00000000  2                 LSW : INT;
00000000  1                 END;
```

```
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE ICMD_DATA:SODAMO
00000000  1  #INCLUDE ISPEC_DATA:SODAMO
00000000  1  #INCLUDE ICHILDREN:SODAMO
00000000  1  #INCLUDE IDISPLAY:SODAMO
00000000  1
00000000  1  VAR
00000000  1  $EXTVAR+$
00000000  1      SEMANTIC_ERROR : INT;
00000000  1      CMD_STACK : CMD_ARRAY_PTR;
00000000  1      CMD_STACK_NDX : INT;
00000000  1      SPEC_STACK : SPECABLE_ARRAY_PTR;
00000000  1      MEASUREMENT_TYPE : INT;
00000000  1      MEAS_DISP_TYPE : INT;
00000000  1      MEAS_SETUP : CMD_ARRAY;
00000000  1      MARK_PTR : PTR;
00000000  1      CURRENT_DISPLAY : INT;
00000000  1      CONFIGURATION : CONFIG_REC_TYPE;
00000000  1  $EXTVAR-$
00000000  1      SYM_DATA : SYMBUFF_PTR;
00000004  1      SMALL_SYM_DATA : SMALL_SYMBUFF_PTR;
00000008  1      SYM_DATA_PTR : PTR;
0000000C  1      SYM_DATA_SIZE : INT;
0000000E  1      STACK_PTR : SPECABLE_TYPE_PTR;
00000012  1      ERROR : INT;
00000014  1      CMD_DATA : CMD_DATA_TYPE;
00000064  1      CMD_TEMP : CMD_DATA_TYPE;
000000B4  1
000000B4  1  $CALL_ABS_LONG ON$
00000000  1  PROCEDURE OUTIT(L:CHAR;V:INT;B:CHAR);EXTERNAL;
00000000  1  PROCEDURE PROC_INIT(FILE_NAME : PTR; VAR DISC : INT;
00000000  2                       VAR PROGNO, PROCID, LANGUAGE, ERROR : INT); EXTERNAL;
00000000  1  FUNCTION  PROC_NUM(PROGNO : INT; PROC_NAME : INTEGER; VAR ERROR : INT) : INT; EXTERNAL;
00000000  1  PROCEDURE FIND_SYM(PPTR : PATH_PTR; SPTR : PTR; VAR SYMTYPE : SYMSET;
00000000  2                      VAR LENGTH, ERROR : INT); EXTERNAL;
00000000  1  PROCEDURE BUILD_OP(OP_CODE : OP_CODES; VAR CMD_ELEMENT : CMD_DATA_TYPE); EXTERNAL;
00000000  1  PROCEDURE ADD_CMD_DATA(VAR DATA : CMD_DATA_TYPE); EXTERNAL;
00000000  1  PROCEDURE BUILD_VAR(PATH : PATH_PTR; VAR SYM_DESC : SYM_DESC_TYPE;
00000000  2                       SYMBOL : PTR; LENGTH : INT;
00000000  2                       VAR_STACK : SPECABLE_TYPE_PTR;
00000000  2                       VAR CMD_ELEMENT, CMD_ATEMP : CMD_DATA_TYPE); EXTERNAL;
00000000  1  PROCEDURE BUILD_MOD(PATH : PATH_PTR; VAR SYM_DESC : SYM_DESC_TYPE;
00000000  2                       SYMBOL : PTR; LENGTH : INT;
00000000  2                       VAR CMD_ELEMENT, CMD_ATEMP : CMD_DATA_TYPE); EXTERNAL;
00000000  1  PROCEDURE GET_GLB_SYM(VAR ABS_FILE : VECTORO_7; ABS_DISC : INT; VAR SYMBOL : VECTORO_7;
00000000  2                         VAR ADDRESS : INTEGER; VAR ERROR : INT); EXTERNAL;
00000000  1  PROCEDURE BUILD_LINES(CMD_ELEMENT : CMD_DATA_TYPE); EXTERNAL;
00000000  1  $CALL_PC_SHORT ON$
00000000  1  PROCEDURE INCREMENT_STACK(VAR STACK : SPECABLE_TYPE_PTR); EXTERNAL;
00000000  1  PROCEDURE BUILD_LINE(VAR SYM_DESC : SYM_DESC_TYPE; LINE1, LINE2 : INT;
00000000  2                       VAR CMD_ELEMENT, CMD_ATEMP : CMD_DATA_TYPE); EXTERNAL;
00000000  1  PROCEDURE BUILD_VALUE(VALUE : INTEGER; REL_OP : INT; VAR CMD_ELEMENT : CMD_DATA_TYPE); EXTERNAL;
00000000  1  PROCEDURE BUILD_PROCS(VAR SYM_DESC : SYM_DESC_TYPE;
00000000  2                         VAR CMD_ELEMENT : CMD_DATA_TYPE); EXTERNAL;
00000000  1  PROCEDURE ADD_ACCESS(ADDESS : INT); EXTERNAL;
00000000  1  PROCEDURE POST_PROC(VAR STACK : CMD_ARRAY_PTR; OP_CODE : OP_CODES); EXTERNAL;
00000000  1  PROCEDURE SYMBOL_MESSAGE(MESS_NUM : INT; VAR IDENT : VECTORO_7; MESSAGE : MESSAGE_TYPES); EXTERNAL;
00000000  1  PROCEDURE LINE_MESSAGE(MESS_NUM : INT; LINE : INT; MESSAGE : MESSAGE_TYPES); EXTERNAL;
00000000  1  PROCEDURE SYSTEM_MESSAGE(MESS_NUM, MESS_CODE : INT; MESSAGE : MESSAGE_TYPES); EXTERNAL;
00000000  1  PROCEDURE GENERAL_MESSAGE(MESS_NUM : INT; MESSAGE : MESSAGE_TYPES); EXTERNAL;
00000000  1  PROCEDURE FILE_MESSAGE(MESS_NUM : INT; FILE_NAME : VECTORO_7; FILE_DISC : INT;
00000000  2                          MESSAGE_CODE : MESSAGE_TYPES); EXTERNAL;
00000000  1  FUNCTION  DB_ERROR(ERROR : INT) : BOOLEAN; EXTERNAL;
00000000  1
00000000  1  $GLOBPROC+$
00000000  1
00000000  1  FUNCTION GET_PATH(TEMP_PTR : SPECABLE_TYPE_PTR; VAR SYM_DESC : SYM_DESC_TYPE) : BOOLEAN;
00000000  2  LABEL 1;
00000001  2  VAR
00000001  2      PROCESSOR_ID : INT;
00000004  2      DONE : BOOLEAN;
```

```
00000004  2  BEGIN
00000004  2  GET_PATH := TRUE;
0000000A  2  DONE := FALSE;
0000000E  2  SYM_DESC.PROC_NAME[0] := 0020H;
0000001A  2  SYM_DESC.FILE_NAME[0] := 0020H;
00000026  2  SYM_DESC.FLAG := FALSE;
0000002E  2  WHILE NOT DONE DO
00000036  2      BEGIN
00000036  2      INCREMENT_STACK(TEMP_PTR);
00000040  2      CASE TEMP_PTR^.OP_CODE OF
0000004C  2           SPEC_PROC : BEGIN                    {path_proc_name}
0000004C  2                SYM_DESC.PROC_NAME := TEMP_PTR^.IDENT;
00000064  2                END;
00000068  2           SPEC_FILE : BEGIN                    {path_file_name}
00000068  2                SYM_DESC.FILE_NAME := TEMP_PTR^.IDENT;
00000080  2                SYM_DESC.FILE_DISC := TEMP_PTR^.DISC;
0000008E  2                DONE := TRUE;
00000094  2                END;
00000098  2           SPEC_OPERAND : BEGIN                 {operand}
00000098  2                IF TEMP_PTR^.OPERAND = SPEC_OP_DP THEN
000000A8  2                     SYM_DESC.FLAG := TRUE;
000000B2  2                END;
000000B6  2           SPEC_END : BEGIN                     {end of spec stack}
000000B6  2                SYSTEM_MESSAGE(222,0,Error);
000000C6  2                GET_PATH := FALSE;
000000CA  2                END;
000000CE  2           OTHERWISE ; {no error trap}
000000CE  2           END;
00000102  2      END;
0000010C  2  PROG_INIT(PTR(ADDR(SYM_DESC.FILE_NAME)),SYM_DESC.FILE_DISC,SYM_DESC.FILE_NUM,PROCESSOR_ID,SYM_DESC.LANGUAGE,ERROR);
00000136  2  IF DB_ERROR(ERROR) THEN
00000146  2      BEGIN
00000146  2      FILE_MESSAGE(1,SYM_DESC.FILE_NAME,SYM_DESC.FILE_DISC,Error);
00000164  2      GET_PATH := FALSE;
00000168  2      GOTO 1; {error trapped}
0000016C  2      END;
0000016C  2  IF SYM_DESC.PROC_NAME[0] <> 0020H THEN
0000017E  2      BEGIN
0000017E  2      SYM_DESC.PROC_NUM := PROC_NUM(SYM_DESC.FILE_NUM,INTEGER(ADDR(SYM_DESC.PROC_NAME)),ERROR);
000001A6  2      IF DB_ERROR(ERROR) THEN
000001B6  2           BEGIN
000001B6  2           SYSTEM_MESSAGE(221,ERROR,Error);
000001C8  2           GET_PATH := FALSE;
000001CC  2           GOTO 1; {error trapped}
000001D0  2           END;
000001D0  2      IF SYM_DESC.PROC_NUM = 0 THEN
000001DC  2           BEGIN
000001DC  2           SYMBOL_MESSAGE(4,SYM_DESC.PROC_NAME,Error);
000001EE  2           GET_PATH := FALSE;
000001F2  2           END;
000001F2  2      END
000001F6  2  ELSE
000001F6  2      SYM_DESC.PROC_NUM := 0;
000001FE  2  1 :
000001FE  2  END;
00000000  1
00000000  1  FUNCTION ANOTHER_LINE(TEMP_PTR : SPECABLE_TYPE_PTR) : BOOLEAN;
0000020C  2  BEGIN
0000020C  2  INCREMENT_STACK(TEMP_PTR);
00000216  2  IF TEMP_PTR^.OP_CODE = SPEC_LINE THEN
00000224  2      ANOTHER_LINE := TRUE
0000022E  2  ELSE
0000022E  2      ANOTHER_LINE := FALSE;
00000232  2  END;
00000000  1
00000000  1  PROCEDURE FMT_SPEC(TERMINATION : INT);
00000000  2  LABEL 1, 2, 3, 4, 5;
00000000  2  VAR
00000000  2      ON_VAR : BOOLEAN;
00000001  2      PATH : PATH_PTR;
00000006  2      LENGTH : INT;
00000008  2      SYM_DESC : SYM_DESC_TYPE;
00000048  2      TEMP : INT;
0000004A  2      LINE1 : INT;
0000004C  2      LINE2 : INT;
```

```
0000004E  2      ADDRESS : INTEGER;
00000240  2  BEGIN
00000240  2  ON_VAR := FALSE;
00000244  2  LINE1 := -1;
00000248  2  LINE2 := -1;
00000250  2  WHILE (STACK_PTR^.OP_CODE <> TERMINATION) AND (SEMANTIC_ERROR = 0) DO
00000270  2      BEGIN
00000270  2      CASE STACK_PTR^.OP_CODE OF
00000278  2           SPEC_VEND : BEGIN          {end of variable sub-stack}
00000278  2                ON_VAR := FALSE;
0000027C  2                END;
00000280  2           SPEC_END : BEGIN           {end of spec stack}
00000280  2                END;
00000284  2           SPEC_PTR : BEGIN           {^}
00000284  2                END;
00000288  2           SPEC_INDEX : BEGIN         {numeric index}
00000288  2                END;
0000028C  2           SPEC_SCALAR : BEGIN        {scalar index}
0000028C  2                END;
00000290  2           SPEC_IDENT : BEGIN         {identifier}
00000290  2                IF NOT ON_VAR THEN
00000298  2                     BEGIN
00000298  2                     SYM_DESC.SYMBOL_NAME := STACK_PTR^.IDENT;
000002AC  2                     ON_VAR := TRUE;
000002B2  2                     IF NOT GET_PATH(STACK_PTR,SYM_DESC) THEN
000002C4  2                          GOTO 3;
000002C8  2                     SYMBOL_MESSAGE(31,SYM_DESC.SYMBOL_NAME,Status);
000002D8  2                     NEW(PATH);
000002EA  2                     LENGTH := SYM_DATA_SIZE;
000002F0  2                     IF LENGTH > MAX_SYM_SIZE THEN
000002FC  2                          LENGTH := MAX_SYM_SIZE;
00000302  2                     PATH^.SYM := SYM_DESC.SYMBOL_NAME;
00000312  2                     PATH^.PROC_NUM := SYM_DESC.PROC_NUM;
0000031C  2                     PATH^.PROG_NUM := SYM_DESC.FILE_NUM;
00000325  2                     FIND_SYM(PATH,SYM_DATA_PTR,SYM_DESC.SYMBOL_TYPE,LENGTH,ERROR);
00000346  2                     IF DB_ERROR(ERROR) THEN
00000356  2                          BEGIN
00000356  2                          IF ERROR = 11 THEN
00000362  2                               SYMBOL_MESSAGE(55,SYM_DESC.SYMBOL_NAME,Error)
00000378  2                          ELSE IF ERROR = 12 THEN
00000384  2                               SYMBOL_MESSAGE(9,SYM_DESC.SYMBOL_NAME,Error)
0000039A  2                          ELSE
0000039A  2                               SYSTEM_MESSAGE(231,ERROR,Error);
000003AC  2                          GOTO 1; {error trapped}
000003B0  2                          END;
000003B0  2                     IF (SYM_DESC.SYMBOL_TYPE <> Vari) AND (SYM_DESC.SYMBOL_TYPE <> Parm) THEN
000003CE  2                          SYMBOL_MESSAGE(9,SYM_DESC.SYMBOL_NAME,Error)
000003E4  2                     ELSE BEGIN
000003E4  2                          BUILD_VAR(PATH,SYM_DESC,
000003E4  2                                    SYM_DATA_PTR,LENGTH,STACK_PTR,
000003E4  2                                    CMD_DATA,CMD_TEMP);
0000040C  2                          END;
0000040C  2                 1 : DISPOSE(PATH);
0000041E  2                     SYM_DATA_SIZE := SYM_DATA_SIZE - LENGTH;
00000426  2                     SYM_DATA_PTR := PTR(INTEGER(SYM_DATA_PTR) + SHIFT(LENGTH,+1));
00000432  2                     ADD_CMD_DATA(CMD_DATA);
0000043E  2                     IF CMD_TEMP.SIZES[0] <> -1 THEN  {has entries}
0000044C  2                          ADD_CMD_DATA(CMD_TEMP);
00000458  2                     END;
00000458  2                3 :
00000458  2                END;
0000045C  2           SPEC_LINE : BEGIN          {line}
0000045C  2                IF ANOTHER_LINE(STACK_PTR) THEN
0000046C  2                     LINE1 := STACK_PTR^.VALUE
0000047C  2                ELSE BEGIN
0000047C  2                     IF LINE1 = -1 THEN
00000488  2                          LINE1 := STACK_PTR^.VALUE
00000498  2                     ELSE
00000498  2                          LINE2 := STACK_PTR^.VALUE;
000004A4  2                     LINE_MESSAGE(32,LINE1,Status);
000004B4  2                     IF NOT GET_PATH(STACK_PTR,SYM_DESC) THEN
000004C6  2                          GOTO 4;
000004CA  2                     IF LINE2 <> -1 THEN
000004D6  2                          IF LINE2 <= LINE1 THEN
000004DE  2                               SEMANTIC_ERROR := 19;
```

```
000004E4  2                  BUILD_LINE(SYM_DESC,LINE1,LINE2,CMD_DATA,CMD_TEMP);
00000502  2              ADD_CMD_DATA(CMD_TEMP);
0000050E  2              ADD_CMD_DATA(CMD_DATA);
0000051A  2              LINE1 := -1;
00000520  2              LINE2 := -1;
00000526  2              END;
00000526  2          4 :
00000526  2          END;
0000052A  2      SPEC_SYMBOL,             {symbol}
0000052A  2      SPEC_MODULE : BEGIN      {module}
0000052A  2          SYM_DESC.SYMBOL_NAME := STACK_PTR^.IDENT;
0000053E  2          IF NOT GET_PATH(STACK_PTR,SYM_DESC) THEN
00000550  2              GOTO 5;
00000554  2          ERROR := 0;
00000558  2          IF (STACK_PTR^.OP_CODE = SPEC_SYMBOL) AND SYM_DESC.FLAG THEN
00000570  2              BEGIN
00000570  2              GET_GLD_SYM(CONFIGURATION.ABS_FILE,CONFIGURATION.ABS_DISC,SYM_DESC.SYMBOL_NAME,ADDRESS,ERROR);
00000590  2              IF ERROR = 0 THEN
00000598  2                  BEGIN
00000598  2                  BUILD_VALUE(ADDRESS,0,CMD_DATA);
000005AC  2                  ADD_CMD_DATA(CMD_DATA);
000005B8  2                  END;
000005B8  2              END;
000005B8  2          IF (STACK_PTR^.OP_CODE = SPEC_MODULE) OR (NOT SYM_DESC.FLAG) OR (ERROR <> 0) THEN
000005E2  2              BEGIN
000005E2  2              SYMBOL_MESSAGE(30,SYM_DESC.SYMBOL_NAME,Status);
000005F2  2              NEW(PATH);
00000604  2              LENGTH := SYM_DATA_SIZE;
0000060A  2              IF LENGTH > MAX_SYM_SIZE THEN
00000616  2                  LENGTH := MAX_SYM_SIZE;
0000061C  2              PATH^.SYM := SYM_DESC.SYMBOL_NAME;
0000062C  2              PATH^.PROC_NUM := 0;
00000634  2              PATH^.PROG_NUM := SYM_DESC.FILE_NUM;
0000063E  2              FIND_SYM(PATH,SYM_DATA_PTR,SYM_DESC.SYMBOL_TYPE,LENGTH,ERROR);
0000065E  2              IF DB_ERROR(ERROR) THEN
0000066E  2                  BEGIN
0000066E  2                  IF ERROR = 12 THEN
0000067A  2                      SYMBOL_MESSAGE(4,SYM_DESC.SYMBOL_NAME,Error)
00000690  2                  ELSE
00000690  2                      SYSTEM_MESSAGE(232,ERROR,Error);
000006A2  2                  GOTO 2; {error trapped}
000006A6  2                  END;
000006A6  2              IF (SYM_DESC.SYMBOL_TYPE <> Prog) AND
000006A6  2                 (SYM_DESC.SYMBOL_TYPE <> Proc) AND
000006A6  2                 (SYM_DESC.SYMBOL_TYPE <> Func) THEN
000006D0  2                  SYMBOL_MESSAGE(4,SYM_DESC.SYMBOL_NAME,Error)
000006E6  2              ELSE BEGIN
000006E6  2                  SYM_DESC.PROC_NUM := PROC_NUM(SYM_DESC.FILE_NUM,INTEGER(ADDR(SYM_DESC.SYMBOL_NAME)),ERROR);
00000704  2                  IF DB_ERROR(ERROR) THEN
00000714  2                      BEGIN
00000714  2                      SYSTEM_MESSAGE(233,ERROR,Error);
00000726  2                      GOTO 2; {error trapped}
0000072A  2                      END;
0000072A  2                  IF (SYM_DESC.PROC_NUM = 0) AND (SYM_DESC.SYMBOL_TYPE <> Prog) THEN
00000744  2                      SYMBOL_MESSAGE(4,SYM_DESC.SYMBOL_NAME,Error)
0000075A  2                  ELSE BEGIN
0000075A  2                      PATH^.PROC_NUM := SYM_DESC.PROC_NUM;
00000764  2                      PATH^.SYM := SYM_DESC.SYMBOL_NAME;
00000774  2                      BUILD_MOD(PATH,SYM_DESC,
00000774  2                                SYM_DATA_PTR,LENGTH,
00000774  2                                CMD_DATA,CMD_TEMP);
00000798  2                      END;
00000798  2                  END;
00000798  2              ADD_CMD_DATA(CMD_TEMP);
000007A4  2              ADD_CMD_DATA(CMD_DATA);
000007B0  2              2 :
000007B0  2              DISPOSE(PATH);
000007C2  2              END;
000007C2  2          5 :
000007C2  2          END;
000007C6  2      SPEC_VALUE : BEGIN       {value}
000007C6  2          BUILD_VALUE(STACK_PTR^.VALUE,TEMP,CMD_DATA);
000007E0  2          TEMP := CMD_STACK_NDX + 1;
000007EA  2          CMD_STACK^[CMD_STACK_NDX] := CMD_STACK^[CMD_STACK_NDX-1];
```

```
00000810  2            CMD_STACK_NDX := CMD_STACK_NDX - 1;
00000814  2            IF CMD_STACK^[CMD_STACK_NDX].OP_CODE = OFFSET THEN
0000082C  2                BEGIN
0000082C  2                CMD_STACK^[CMD_STACK_NDX] := CMD_STACK^[CMD_STACK_NDX-1];
0000084E  2                CMD_STACK_NDX := CMD_STACK_NDX - 1;
00000852  2                END;
00000852  2            ADD_CMD_DATA(CMD_DATA);
0000085E  2            CMD_STACK_NDX := TEMP;
00000864  2            END;
00000868  2        SPEC_DXVAL : BEGIN          {dont_care value}
00000868  2            { STACK_PTR^.VALUE }
00000868  2            { STACK_PTR^.MASK  }
00000868  2            END;
0000086C  2        SPEC_PROC : BEGIN           {path_proc_name}
0000086C  2            END;
00000870  2        SPEC_FILE : BEGIN           {path_file_name}
00000870  2            END;
00000874  2        SPEC_OPERAND : BEGIN        {operand}
00000874  2            CASE STACK_PTR^.OPERAND OF ,
00000882  2                SPEC_OP_RE : BEGIN          {read}
00000882  2                    ADD_ACCESS(1);
0000088C  2                    END;
00000890  2                SPEC_OP_WR : BEGIN          {write}
00000890  2                    ADD_ACCESS(2);
0000089A  2                    END;
0000089E  2                SPEC_OP_RW : BEGIN          {read_write}
0000089E  2                    ADD_ACCESS(3);
000008A8  2                    END;
000008AC  2                SPEC_OP_EE : BEGIN          {entry_exit}
000008AC  2                    ADD_ACCESS(3);
000008B6  2                    END;
000008BA  2                SPEC_OP_EN : BEGIN          {entry}
000008BA  2                    ADD_ACCESS(1);
000008C4  2                    END;
000008C8  2                SPEC_OP_EX : BEGIN          {exit}
000008C8  2                    ADD_ACCESS(2);
000008D2  2                    END;
000008D6  2                SPEC_OP_PC : BEGIN          {program_counter}
000008D6  2                    END;
000008DA  2                SPEC_OP_TA : BEGIN          {transfer_address}
000008DA  2                    END;
000008DE  2                SPEC_OP_EQ : BEGIN          {=}
000008DE  2                    TEMP := 2;
000008E4  2                    END,
000008E8  2                SPEC_OP_NE : BEGIN          {<>}
000008E8  2                    TEMP := 5;
000008EE  2                    END;
000008F2  2                SPEC_OP_LT : BEGIN          {<}
000008F2  2                    TEMP := 4;
000008F8  2                    END;
000008FC  2                SPEC_OP_GT : BEGIN          {>}
000008FC  2                    TEMP := 1;
00000902  2                    END;
00000906  2                SPEC_OP_LE : BEGIN          {<=}
00000906  2                    TEMP := 6;
0000090C  2                    END;
00000910  2                SPEC_OP_GE : BEGIN          {>=}
00000910  2                    TEMP := 3;
00000916  2                    END;
0000091A  2                SPEC_OP_OFF : BEGIN
0000091A  2                    END;
0000091E  2                SPEC_OP_ANY : BEGIN         {any_stste}
0000091E  2                    END;
00000922  2                SPEC_OP_ALL : BEGIN         {all}
00000922  2                    IF GET_PATH(STACK_PTR,SYM_DESC) THEN
00000936  2                        BEGIN
00000936  2                        FILE_MESSAGE(38,SYM_DESC.FILE_NAME,SYM_DESC.FILE_DISC,Status);
0000094E  2                        BUILD_PROCS(SYM_DESC,CMD_DATA);
0000095C  2                        END;
0000095C  2                    END;
00000960  2                SPEC_OP_BY : BEGIN          {followed_by}
00000960  2                    BUILD_OP(FOLLOWED_BY,CMD_DATA);
00000970  2                    ADD_CMD_DATA(CMD_DATA);
0000097C  2                    END;
```

```
00000980  2                      SPEC_OP_OR : BEGIN          {or}
00000980  2                           END;
00000984  2                      SPEC_OP_DP : BEGIN          {default path used}
00000984  2                           END;
00000988  2                      OTHERWISE SYSTEM_MESSAGE(234,INT(STACK_PTR^.OPERAND),Error);
0000099E  2                      END;
000009FC  2                 END;
00000A00  2            SPEC_ADDRESS : BEGIN       {address}
00000A00  2                 BUILD_VALUE(STACK_PTR^.VALUE,0,CMD_DATA);
00000A18  2                 ADD_CMD_DATA(CMD_DATA);
00000A24  2                 END;
00000A28  2            OTHERWISE SYSTEM_MESSAGE(235,INT(STACK_PTR^.OP_CODE),Error);
00000A3C  2            END;
00000A7A  2       INCREMENT_STACK(STACK_PTR);
00000A84  2       END;
00000A88  2  END;
00000000  1
00000000  1  PROCEDURE BUILD_CMD_STACK(ACTION : OP_CODES);
00000000  2
00000000  2  PROCEDURE FINISH_CMD_STACK;
00000A90  3  BEGIN
00000A90  3  BUILD_OP(ACTION,CMD_DATA);
00000AA4  3  ADD_CMD_DATA(CMD_DATA);
00000AB0  3  BUILD_OP(EOL,CMD_DATA);
00000AC0  3  ADD_CMD_DATA(CMD_DATA);
00000ACC  3  END;
00000000  2
00000000  2  PROCEDURE FINISH_SETUP(ELEMENT : CMD_TYPES);
00000AD4  3  BEGIN
00000AD4  3  IF MEAS_SETUP[ELEMENT].MARK <> NIL THEN
00000AEE  3      RELEASE(MEAS_SETUP[ELEMENT].MARK);
00000B08  3  MEAS_SETUP[ELEMENT].CMD := CMD_STACK;
00000B1C  3  MEAS_SETUP[ELEMENT].SPEC := SPEC_STACK;
00000B34  3  MEAS_SETUP[ELEMENT].MARK := MARK_PTR;
00000B4C  3  MARK_PTR := NIL;
00000B50  3  IF ACTION <= BRK_ON THEN
00000B60  3      MEASUREMENT_TYPE := INT(ACTION);
00000B68  3  END;
00000B70  2
00000B70  2  BEGIN
00000B70  2  CURRENT_DISPLAY := Setup;
00000B76  2  STACK_PTR := SPECABLE_TYPE_PTR(SPEC_STACK);
00000B7C  2  IF STACK_PTR <> NIL THEN
00000B84  2      BEGIN
00000B84  2      NEW(CMD_STACK);
00000B96  2      CMD_STACK_NDX := 0;
00000B9A  2      CASE ACTION OF
00000BA4  2           TR_VAR : BEGIN             {trace variables}
00000BA4  2                NEW(SVM_DATA);
00000BB6  2                SVM_DATA_PTR := PTR(SVM_DATA);
00000BBC  2                SVM_DATA_SIZE := SVMBUFF_SIZE;
00000BC2  2                FMT_SPEC(SPEC_END);
00000BCC  2                FINISH_CMD_STACK;
00000BD6  2                IF SEMANTIC_ERROR = 0 THEN
00000BDE  2                     POST_PROC(CMD_STACK,TR_VAR);
00000BEA  2                IF SEMANTIC_ERROR = 0 THEN
00000BF2  2                     BEGIN
00000BF2  2                     FINISH_SETUP(MEASUREMENT);
00000C00  2                     GENERAL_MESSAGE(37,Status);
00000C0C  2                     END;
00000C0C  2                END;
00000C10  2  (*       TR_ASM : BEGIN             {trace variables last_access}
00000C10  2  (*            NEW(SVM_DATA);                                       *)
00000C10  2  (*            SVM_DATA_PTR := PTR(SVM_DATA);                       *)
00000C10  2  (*            SVM_DATA_SIZE := SVMBUFF_SIZE;                       *)
00000C10  2  (*            FMT_SPEC(SPEC_END);                                  *)
00000C10  2  (*            FINISH_CMD_STACK;                                    *)
00000C10  2  (*            IF SEMANTIC_ERROR = 0 THEN                           *)
00000C10  2  (*                 POST_PROC(CMD_STACK,TR_ASM);                    *)
00000C10  2  (*            IF SEMANTIC_ERROR = 0 THEN                           *)
00000C10  2  (*                 BEGIN                                           *)
00000C10  2  (*                 FINISH_SETUP(MEASUREMENT);                      *)
00000C10  2  (*                 GENERAL_MESSAGE(37,Status);                     *)
00000C10  2  (*                 END;                                            *)
00000C10  2  (*            END;                                                 *)
```

```
00000C10  2           TR_DAT : BEGIN            (trace data_flow)
00000C10  2               NEW(SYM_DATA);
00000C22  2               SYM_DATA_PTR := PTR(SYM_DATA);
00000C28  2               SYM_DATA_SIZE := SYMBUFF_SIZE;
00000C2E  2               FMT_SPEC(SPEC_END);
00000C38  2               FINISH_CMD_STACK;
00000C42  2               IF SEMANTIC_ERROR = 0 THEN
00000C4A  2                    POST_PROC(CMD_STACK,TR_DAT);
00000C58  2               IF SEMANTIC_ERROR = 0 THEN
00000C60  2                    BEGIN
00000C60  2                    FINISH_SETUP(MEASUREMENT);
00000C6E  2                    GENERAL_MESSAGE(37,Status);
00000C7A  2                    END;
00000C7A  2               END;
00000C7E  2           TR_MOD : BEGIN            (trace modules)
00000C7E  2               NEW(SMALL_SYM_DATA);
00000C90  2               SYM_DATA_PTR := PTR(SMALL_SYM_DATA);
00000C96  2               SYM_DATA_SIZE := SMALL_SYMBUFF_SIZE;
00000C9C  2               FMT_SPEC(SPEC_END);
00000CA6  2               FINISH_CMD_STACK;
00000CB0  2               IF SEMANTIC_ERROR = 0 THEN
00000CB8  2                    POST_PROC(CMD_STACK,TR_MOD);
00000CC6  2               IF SEMANTIC_ERROR = 0 THEN
00000CCE  2                    BEGIN
00000CCE  2                    FINISH_SETUP(MEASUREMENT);
00000CDC  2                    GENERAL_MESSAGE(37,Status);
00000CE8  2                    END;
00000CE8  2               END;
00000CEC  2           TR_STA : BEGIN            (trace statements)
00000CEC  2               NEW(SMALL_SYM_DATA);
00000CFE  2               SYM_DATA_PTR := PTR(SMALL_SYM_DATA);
00000D04  2               SYM_DATA_SIZE := SMALL_SYMBUFF_SIZE;
00000D0A  2               FMT_SPEC(SPEC_END);
00000D14  2               FINISH_CMD_STACK;
00000D1E  2               IF SEMANTIC_ERROR = 0 THEN
00000D26  2                    BEGIN
00000D26  2                    FINISH_SETUP(MEASUREMENT);
00000D34  2                    GENERAL_MESSAGE(37,Status);
00000D40  2                    END;
00000D40  2               END;
00000D44  2           TR_XXX : BEGIN            (trace statements don't care)
00000D44  2               NEW(SMALL_SYM_DATA);
00000D56  2               SYM_DATA_PTR := PTR(SMALL_SYM_DATA);
00000D5C  2               SYM_DATA_SIZE := SMALL_SYMBUFF_SIZE;
00000D62  2               FINISH_CMD_STACK;
00000D6C  2               IF SEMANTIC_ERROR = 0 THEN
00000D74  2                    BEGIN
00000D74  2                    FINISH_SETUP(MEASUREMENT);
00000D82  2                    GENERAL_MESSAGE(37,Status);
00000D8E  2                    END;
00000D8E  2               END;
00000D92  2           DISP_VAR : BEGIN          (display variable)
00000D92  2               NEW(SMALL_SYM_DATA);
00000DA4  2               SYM_DATA_PTR := PTR(SMALL_SYM_DATA);
00000DAA  2               SYM_DATA_SIZE := SMALL_SYMBUFF_SIZE;
00000DB0  2               FMT_SPEC(SPEC_END);
00000DBA  2               FINISH_CMD_STACK;
00000DC4  2               IF SEMANTIC_ERROR = 0 THEN
00000DCC  2                    BEGIN
00000DCC  2                    MEAS_DISP_TYPE := INT(ACTION);
00000DD6  2                    END;
00000DD6  2               END;
00000DDA  2           MOD_VAR : BEGIN           (modify variable)
00000DDA  2               NEW(SMALL_SYM_DATA);
00000DEC  2               SYM_DATA_PTR := PTR(SMALL_SYM_DATA);
00000DF2  2               SYM_DATA_SIZE := SMALL_SYMBUFF_SIZE;
00000DF8  2               FMT_SPEC(SPEC_END);
00000E02  2               FINISH_CMD_STACK;
00000E0C  2               IF SEMANTIC_ERROR = 0 THEN
00000E14  2                    POST_PROC(CMD_STACK,MOD_VAR);
00000E22  2               IF SEMANTIC_ERROR = 0 THEN
00000E2A  2                    BEGIN
00000E2A  2                    MEAS_DISP_TYPE := INT(ACTION);
00000E34  2                    END;
00000E34  2               END;
```

```
00000E38  2      TI_MOD : BEGIN             {time modules}
00000E38  2           NEW(SMALL_SYM_DATA);
00000E4A  2           SYM_DATA_PTR := PTR(SMALL_SYM_DATA);
00000E50  2           SYM_DATA_SIZE := SMALL_SYMBUFF_SIZE;
00000E56  2           FMT_SPEC(SPEC_END);
00000E60  2           FINISH_CMD_STACK;
00000E6A  2           IF SEMANTIC_ERROR = 0 THEN
00000E72  2                BEGIN
00000E72  2                FINISH_SETUP(MEASUREMENT);
00000E80  2                GENERAL_MESSAGE(37,Status);
00000E8C  2                END;
00000E8C  2           END;
00000E90  2      CT_STA : BEGIN             {count statements}
00000E90  2           NEW(SMALL_SYM_DATA);
00000EA2  2           SYM_DATA_PTR := PTR(SMALL_SYM_DATA);
00000EA8  2           SYM_DATA_SIZE := SMALL_SYMBUFF_SIZE;
00000EAE  2           FMT_SPEC(SPEC_END);
00000EB8  2           IF SEMANTIC_ERROR = 0 THEN
00000EC0  2                BUILD_LINES(CMD_STACK^[CMD_STACK_NDX - 1]);
00000EDA  2           FINISH_CMD_STACK;
00000EE4  2           IF SEMANTIC_ERROR = 0 THEN
00000EEC  2                BEGIN
00000EEC  2                FINISH_SETUP(MEASUREMENT);
00000EFA  2                GENERAL_MESSAGE(37,Status);
00000F06  2                END;
00000F06  2           END;
00000F0A  2      BRK_ON : BEGIN             {break on}
00000F0A  2           NEW(SMALL_SYM_DATA);
00000F1C  2           SYM_DATA_PTR := PTR(SMALL_SYM_DATA);
00000F22  2           SYM_DATA_SIZE := SMALL_SYMBUFF_SIZE;
00000F28  2           FMT_SPEC(SPEC_END);
00000F32  2           FINISH_CMD_STACK;
00000F3C  2           IF SEMANTIC_ERROR = 0 THEN
00000F44  2                BEGIN
00000F44  2                FINISH_SETUP(MEASUREMENT);
00000F52  2                GENERAL_MESSAGE(37,Status);
00000F5E  2                END;
00000F5E  2           END;
00000F62  2      CD_ENA : BEGIN             {measurement enable}
00000F62  2           NEW(SMALL_SYM_DATA);
00000F74  2           SYM_DATA_PTR := PTR(SMALL_SYM_DATA);
00000F7A  2           SYM_DATA_SIZE := SMALL_SYMBUFF_SIZE;
00000F80  2           IF (STACK_PTR^.OP_CODE = SPEC_OPERAND) AND (STACK_PTR^.OPERAND = SPEC_OP_OFF) THEN
00000FA8  2                BEGIN
00000FA8  2                DISPOSE(CMD_STACK);
00000FBA  2                CMD_STACK := NIL;
00000FBE  2                END
00000FC2  2           ELSE BEGIN
00000FC2  2                FMT_SPEC(SPEC_END);
00000FCC  2                FINISH_CMD_STACK;
00000FD6  2                END;
00000FD6  2           DISPOSE(SMALL_SYM_DATA);
00000FE8  2           SYM_DATA := NIL;
00000FEC  2           IF SEMANTIC_ERROR = 0 THEN
00000FF4  2                BEGIN
00000FF4  2                FINISH_SETUP(START_ON);
00001002  2                GENERAL_MESSAGE(37,Status);
0000100E  2                END;
0000100E  2           END;
00001012  2      CD_DIS : BEGIN             {measurement disable}
00001012  2           NEW(SMALL_SYM_DATA);
00001024  2           SYM_DATA_PTR := PTR(SMALL_SYM_DATA);
0000102A  2           SYM_DATA_SIZE := SMALL_SYMBUFF_SIZE;
00001030  2           IF (STACK_PTR^.OP_CODE = SPEC_OPERAND) AND (STACK_PTR^.OPERAND = SPEC_OP_OFF) THEN
00001058  2                BEGIN
00001058  2                DISPOSE(CMD_STACK);
0000106A  2                CMD_STACK := NIL;
0000106E  2                END
00001072  2           ELSE BEGIN
00001072  2                FMT_SPEC(SPEC_END);
0000107C  2                FINISH_CMD_STACK;
00001086  2                END;
00001086  2           DISPOSE(SMALL_SYM_DATA);
00001098  2           SYM_DATA := NIL;
```

```
0000109C  2                 IF SEMANTIC_ERROR = 0 THEN
000010A4  2                      BEGIN
000010A4  2                      FINISH_SETUP(STOP_ON);
00001CB2  2                      GENERAL_MESSAGE(37,Status);
000010BE  2                      END;
000010BE  2                 END;
000010C2  2            AT_RUN : BEGIN              (run)
000010C2  2                 NEW(SMALL_SYM_DATA);
000010D4  2                 SYM_DATA_PTR := PTR(SMALL_SYM_DATA);
000010DA  2                 SYM_DATA_SIZE := SMALL_SYMBUFF_SIZE;
000010E0  2                 FMT_SPEC(SPEC_END);
000010EA  2                 FINISH_CMD_STACK;
000010F4  2                 DISPOSE(SMALL_SYM_DATA);
00001106  2                 SYM_DATA := NIL;
0000110A  2                 IF SEMANTIC_ERROR = 0 THEN
00001112  2                      BEGIN
00001112  2                      FINISH_SETUP(EXECUTION);
0000111E  2                      IF CONFIGURATION.RUN_AT_EXEC THEN
00001126  2                           GENERAL_MESSAGE(37,Status);
00001132  2                      END;
00001132  2                 END;
00001136  2            OTHERWISE SYSTEM_MESSAGE(211,INT(ACTION),Error);
0000114C  2          END;
0000118A  2     END
0000118E  2  ELSE
0000118E  2     SYSTEM_MESSAGE(212,0,Error);
0000119E  2  END;
00000000  1
00000000  1  FUNCTION  SYMBOL_EXISTS(PATH : PATH_PTR) : BOOLEAN;
00000001  2  VAR
00000001  2     SYMBOL_TYPE : SYMSET;
00000002  2     LENGTH : INT;
00000004  2     ERROR : INT;
00000006  2     SYMBOL_DATA : PTR;
000011A6  2  BEGIN
000011A6  2  NEW(SYMBOL_DATA);
000011B8  2  LENGTH := 0;
000011BC  2  FIND_SYM(PATH,PTR(SYMBOL_DATA),SYMBOL_TYPE,LENGTH,ERROR);
000011BC  2  IF ERROR = 11 THEN              (clear OUT_OF_SPACE error)
000011E8  2     ERROR := 0;
000011EC  2  IF (ERROR = 0) AND
000011EC  2     ((SYMBOL_TYPE = Prog) OR (SYMBOL_TYPE = Proc) OR (SYMBOL_TYPE = Func)) THEN
00001222  2     SYMBOL_EXISTS := TRUE
0000122C  2  ELSE
0000122C  2     SYMBOL_EXISTS := FALSE;
00001230  2  DISPOSE(SYMBOL_DATA);
00001242  2  END;
00000000  1

****WARNING ?? - Symbol: LABEL_1, is duplicated in the asmb_sym file.

End of compilation, number of errors=    0

FILE: COMMON:SODAMO      HP 64000 - Pascal    68000 Compiler


00000000  1  "68000" PREPROCESS
00000000  1  $BASE_PAGES
00000000  1  $WIDTH 120$
00000000  1
00000000  1  PROGRAM COMMON_;
00000000  1
00000000  1  $EXTENSIONS ON$
00000000  1  $LIB_ABS_LONG$
00000000  1  $WARN OFF$
00000000  1
00000000  1  TYPE
00000000  1     BYTE = SIGNED_8;
00000000  1     INT = SIGNED_16;
00000000  1     PTR = ^ INTEGER;
00000000  1     VECTOR0_7 = ARRAY[0..7] OF INT;
00000000  1     FMGRNAME = ARRAY[0..7] OF INT;
00000000  1     DOUBLE_WORD = RECORD
00000000  2                 MSW : INT;
```

```
00000000  2                  LSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE IOS_68K:SODAMES
00000000  1  #INCLUDE ICDS_68K:SODAMES
00000000  1  #INCLUDE IAPPLY_68K:SODAMES
00000000  1  #INCLUDE ICMD_DATA:SODAMON
00000000  1  #INCLUDE ISPEC_DATA:SODAMON
00000000  1  #INCLUDE ICHILDREN:SODAMON
00000000  1  #INCLUDE IDISPLAY:SODAMON
00000000  1  #INCLUDE INCLUDE:KIP
00000000  1  #INCLUDE IG_AREA:SODARU
00000000  1
00000000  1  VAR
00000000  1  $GLOBVAR+$
00000000  1  {general internal globals}
00000000  1      STACK_AREA : ARRAY[0..767] OF INT;          {monitor stack}
00000600  1      STACK_ : INT;                               {space        }
00000602  1      IMB_STACK : ARRAY[0..255] OF INT;           {imb stack    }
00000802  1      IMB_STACK_ : INT;                           {space        }
00000804  1      APPLY_STACK : A_TOKEN_PTR;                  {pointer to apply stack}
00000808  1      MARK_PTR : PTR;                             {pointer for mark/release}
0000080C  1      TOKEN_STACK : ARRAY[0..9] OF DOUBLE_WORD;   {stack for apply productions}
00000834  1      TOKEN_PTR : INTEGER;                        {stack pointer}
00000838  1      SEMANTIC_ERROR : INT;
0000083A  1      SEMANTIC_WARNING : BOOLEAN;
0000083B  1      BOARD_ID : INT;                             {soda board ID: 0104H}
0000083E  1      PROTECTED : INT;                            {protected flag}
00000840  1      CODE_REV : INT;                             {code revision number}
00000842  1      SUDS_DATE : INTEGER;                        {date of last suds}
00000846  1  {configuration defaults}
00000846  1      CONFIGURATION : CONFIG_REC_TYPE;            {current configuration}
0000087E  1      DEFAULT_FILE : VECTOR0_7;                   {default}
0000098E  1      DEFAULT_DISC : INT;                         {path   }
00000990  1      DEFAULT_PROC : VECTOR0_7;                   {info   }
000009A0  1      DEFAULT_LINE : INT;
000009A2  1  {miscellaneous globals}
000009A2  1      CURRENT_DISPLAY : INT;                      {IDISPLAY constants}
000009A4  1      DEBUG : DEBUG_TYPE;                         {IDISPLAY stack ids}
000009A8  1      MEASUREMENT_TYPE : INT;                     {the current measurement}
000009AA  1      MEAS_DISP_TYPE : INT;                       {the current field format}
000009AC  1      PARM_REC : PARAMETER_TYPE;                  {ICHILDREN parameters}
000009C4  1      DISPLAY_MASTER : DISPLAY_SPEC;              {display format control}
000009EA  1  {command structures, see below}
000009EA  1      MEAS_SETUP : CMD_ARRAY;                     {measurement structure}
0000091A  1      CMD_STACK : CMD_ARRAY_PTR;                  {command stack}
0000091E  1      CMD_STACK_MAX : INT;                        {index into command stack}
00000920  1      VAR_STACK : SPECABLE_TYPE_PTR;              {stack of record pieces}
00000924  1      SPEC_STACK_PTR : SPECABLE_TYPE_PTR;         {pointer into command stack}
00000928  1      SPEC_STACK : SPECABLE_ARRAY_PTR;            {stack of command pieces}
0000092C  1  {data base variables}
0000092C  1      SYMBOL_COUNT : INT;                         {count of symbols found}
0000092E  1  {miscellaneous globals}
0000092E  1      MONITOR_ID : INT;
00000930  1      DYNAMIC_ID : INT;
00000932  1      DISPLAY_ID : INT;
00000934  1      G_AREA : INT;                               {the BPC address of G_AREA}
00000936  1      VALID_FOOTDC : BOOLEAN;                     {is there a valid FOOTDC}
00000937  1      FILE_NAME : VECTOR0_7;                      {file name, disc, and}
00000948  1      FILE_DISC : INT;                            {dcb for listing and }
0000094A  1      FILE_DCB : INT;                             {configurations     }
0000094C  1      SOURCE_FILE : VECTOR0_7;                    {file name, disc, and}
0000095C  1      SOURCE_DISC : INT;                          {dcb for show/copy   }
0000095E  1      SOURCE_DCB : INT;                           {source file         }
00000960  1      SOURCE_UP : INT;                            {Status of source display}
00000962  1      SOURCE_BUFFER : BUFFER_ARRAY_TYPE;          {for display source}
00000A22  1      DISPLAY : DISPLAY_TYPE;                     {IDISPLAY structure}
00000A44  1  $ORG=400H$
00000A44  1      OS : OS_TYPE;                               {operating system}
00000A44  1  $ORG=200H$
00000A44  1      CDS : CDS_TYPE;                             {control data structures}
```

```
00000A44  1  $END_ORG$
00000A44  1  $GLOBVAR-$
00000A44  1  $EXTVAR+$
00000A44  1  $FAR$
00000A44  1     MONITOR_INB : INT;                          (MONITOR_INB routine entry)
00000A44  1  $BASE_PAGE$
00000A44  1  (display format tables)
00000A44  1     DEFAULT_FORMATS : ARRAY[0..2] OF FMT_PTR;
00000A44  1     CURRENT_FORMATS : ARRAY[0..2] OF FMT_PTR;
00000A44  1     SOFTKEY_FORMATS : ARRAY[0..2] OF INT;
00000A44  1  $EXTVAR-$
00000A44  1
00000A44  1  {
00000A44  1                               MEAS_SETUP = RECORD
00000A44  1                       MEAS        S         CMD;
00000A44  1                       START                 SPEC;
00000A44  1                       STOP                  MARK;
00000A44  1                       WHEN                  END;
00000A44  1                       QUILITY
00000A44  1                                |||
00000A44  1                .----------------|------------------.
00000A44  1               /                ||                   \
00000A44  1                               /  \
00000A44  1               |---------------    --------------|
00000A44  1               |                                 |
00000A44  1               v                                 v
00000A44  1               CMD_STACK      SYM_DATA      SPEC_STACK      VAR_STACK
00000A44  1  CMD_DATA     CMD_STACK_NDX  SYM_DATA_PTR  SPEC_STACK_PTR  VAR_STACK_PTR
00000A44  1           S             D |--->        D              D   |
00000A44  1                           |                               |
00000A44  1                           |                  <-------|
00000A44  1                           |
00000A44  1                        ---|
00000A44  1               --------
00000A44  1
00000A44  1  CMD_TEMP                 |--->
00000A44  1  CMD_TEMP_NDX             |
00000A44  1           S               |
00000A44  1                        ---|
00000A44  1               --------
00000A44  1                 .            .             . .
00000A44  1                 .            .             .
00000A44  1                 .            .             .
00000A44  1               0..31          1024          256
00000A44  1
00000A44  1  S = STATIC
00000A44  1  D = DYNAMIC
00000A44  1  }
00000A44  1
00000A44  1  $CALL_ABS_LONG ON$
00000000  1  PROCEDURE BPC_READ (ADDR_68K : PTR; ADDR_BPC : INT; LENGTH : INT); EXTERNAL;
00000000  1  PROCEDURE BPC_WRITE (ADDR_68K : PTR; ADDR_BPC : INT; LENGTH : INT); EXTERNAL;
00000000  1  PROCEDURE READ_ID_ (VAR ID : INT); EXTERNAL;
00000000  1  PROCEDURE OUTIT(L:CHAR;V:INT;B:CHAR); EXTERNAL;
00000000  1  PROCEDURE FORK_(VAR ENTRY, STACK : INTEGER; VAR ID : INT); EXTERNAL;
00000000  1  PROCEDURE BUILD_CMD_STACK(ACTION : OP_CODES); EXTERNAL;
00000000  1  PROCEDURE ADD_TO_STACK(VAR STACK :SPECABLE_TYPE_PTR; OP_CODE : INT; S_VAL : INT;
00000000  2                         L_VAL : INTEGER; VAR IDENT : VECTOR0_7); EXTERNAL;
00000000  1  PROCEDURE DISPLAY_SOMETHING(DISPLAY : INT; COPY : BOOLEAN); EXTERNAL;
00000000  1  PROCEDURE C_AREA_ADDR(VAR ADDRESS : INT); EXTERNAL;
00000000  1  PROCEDURE SYSTEM_MESSAGE(MESS_NUM, MESS_CODE : INT; MESSAGE : MESSAGE_TYPES); EXTERNAL;
00000000  1  PROCEDURE WRITE_SOFTKEY_FORMAT; EXTERNAL;
00000000  1  $CALL_PC_SHORT ON$
00000000  1
00000000  1  $GLOBPROC+$
00000000  1
00000000  1  PROCEDURE READ_C_AREA;
00000000  2  VAR
00000000  2     TEMP : INT;
00000004  2  BEGIN
00000004  2  {
00000004  2  BPC_READ(PTR(ADDR(TEMP)),C_AREA + ABS_FILE_OFF,1);
00000004  2  IF TEMP <> 0020H THEN
00000004  2  }
```

```
00000004  2      BEGIN
00000004  2      BPC_READ(PTR(ADDR(CONFIGURATION.ABS_FILE)),G_AREA + ABS_FILE_OFF,8);
00000020  2      BPC_READ(PTR(ADDR(CONFIGURATION.ABS_DISC)),G_AREA + ABS_DISC_OFF,1);
0000003C  2      END;
0000003C  2  {
0000003C  2  BPC_READ(PTR(ADDR(TEMP)),G_AREA + EMUL_FILE_OFF,1);
0000003C  2  IF TEMP <> 0020H THEN
0000003C  2  }
0000003C  2      BEGIN
0000003C  2      BPC_READ(PTR(ADDR(CONFIGURATION.EMUL_ID)),G_AREA + EMUL_ID_OFF,1);
00000056  2      BPC_READ(PTR(ADDR(CONFIGURATION.EMUL_FILE)),G_AREA + EMUL_FILE_OFF,8);
00000072  2      BPC_READ(PTR(ADDR(CONFIGURATION.EMUL_DISC)),G_AREA + EMUL_DISC_OFF,1);
0000008E  2      END;
0000008E  2  BPC_READ(PTR(ADDR(TEMP)),G_AREA + REAL_TIME_OFF,1);
000000AA  2  IF TEMP = 0 THEN
000000B2  2      CONFIGURATION.REAL_TIME := FALSE
000000BA  2  ELSE
000000BA  2      CONFIGURATION.REAL_TIME := TRUE;
000000C0  2  WRITE_SOFTKEY_FORMAT;
000000C6  2  END;
00000000  1
00000000  1  PROCEDURE INITIALIZE;
00000000  2  VAR
00000000  2      I : INT;
00000002  2      TPTR : PTR;
00000006  2      ID : INT;
000000CE  2  BEGIN
000000CE  2  REPEAT UNTIL CDS.REQUEST_TYPE = INT(EMPTY);
000000D8  2  BOARD_ID := 0104H;
000000DE  2  CODE_REV := 031AH;              {see IO_UTLS}
000000E4  2  SUDS_DATE := 15011985H;         {ddmmyyyyH}
000000EC  2  READ_ID_(MONITOR_ID);
000000F8  2  STACK_AREA[0] := 01234H;
000000FE  2  IMB_STACK[0] := 01234H;
00000104  2  DYNAMIC_ID := 0;
00000108  2  DISPLAY_ID := 0;
0000010C  2  FORK_(MONITOR_IMB,IMB_STACK_,ID);
00000126  2  NEW(DISPLAY.HEADER);
00000138  2  NEW(DISPLAY.SCREEN);
0000014A  2  NEW(DISPLAY.UNDER);
0000015C  2  NEW(DISPLAY.LINE);
0000016E  2  FOR I := 1 TO SCREEN_SIZE DO
00000174  2      NEW(SOURCE_BUFFER[I].LINE);
000001A8  2  TPTR := PTR(INTEGER(DISPLAY.HEADER) + 2);
000001B2  2  BPC_READ(TPTR,SCREEN_START,40);
000001C4  2  FOR I := 0 TO 3 DO
000001C8  2      BEGIN
000001C8  2      MEAS_SETUP[CMD_TYPES(I)].CMD := NIL;
000001DC  2      MEAS_SETUP[CMD_TYPES(I)].SPEC := NIL;
000001F4  2      MEAS_SETUP[CMD_TYPES(I)].MARK := NIL;
0000020C  2      END;
0000021C  2  SEMANTIC_ERROR := 0;
00000220  2  SEMANTIC_WARNING := FALSE;
00000224  2  MARK(MARK_PTR);
00000230  2  NEW(SPEC_STACK);
00000242  2  SPEC_STACK_PTR := SPECABLE_TYPE_PTR(SPEC_STACK);
00000248  2  ADD_TO_STACK(SPEC_STACK_PTR,SPEC_OPERAND,SPEC_OP_OFF,INTEGER(I),VECTOR0_7(I));
0000026C  2  BUILD_CMD_STACK(CB_ENA);
00000278  2  MEAS_DISP_TYPE := INT(TR_XXX);
0000027E  2  WRITE_SOFTKEY_FORMAT;
00000284  2  MARK(MARK_PTR);
00000290  2  NEW(SPEC_STACK);
000002A2  2  SPEC_STACK_PTR := SPECABLE_TYPE_PTR(SPEC_STACK);
000002A8  2  ADD_TO_STACK(SPEC_STACK_PTR,SPEC_OPERAND,SPEC_OP_OFF,INTEGER(I),VECTOR0_7(I));
000002CC  2  BUILD_CMD_STACK(CB_DIS);
000002D8  2  MARK(MARK_PTR);
000002E4  2  NEW(SPEC_STACK);
000002F6  2  SPEC_STACK_PTR := SPECABLE_TYPE_PTR(SPEC_STACK);
000002FC  2  ADD_TO_STACK(SPEC_STACK_PTR,SPEC_OPERAND,SPEC_OP_TA,INTEGER(I),VECTOR0_7(I));
00000320  2  BUILD_CMD_STACK(AT_RUN);
0000032C  2  MARK(MARK_PTR);
00000338  2  NEW(SPEC_STACK);
0000034A  2  SPEC_STACK_PTR := SPECABLE_TYPE_PTR(SPEC_STACK);
00000350  2  ADD_TO_STACK(SPEC_STACK_PTR,SPEC_END,I,INTEGER(I),VECTOR0_7(I));
00000374  2  BUILD_CMD_STACK(TR_XXX);
```

```
00000380  2  IF SEMANTIC_ERROR <> 0 THEN
00000388  2      SYSTEM_MESSAGE(1211,SEMANTIC_ERROR,Error);
0000039C  2  G_AREA_ADDR(G_AREA);
000003A8  2  DEFAULT_FILE[0] := 0020H;
000003AE  2  DEFAULT_DISC := -1;
000003B4  2  DEFAULT_PROC[0] := 0020H;
000003BA  2  DEFAULT_LINE := -1;
000003C0  2  SOURCE_FILE[0] := 0020H;
000003C6  2  SOURCE_DISC := -1;
000003CC  2  SOURCE_UP := 0;                 {source buffers unitialized}
000003D0  2  CONFIGURATION.LENGTH := 11;     {length of structure for file I/O}
000003D6  2  BPC_READ(PTR(ADDR(I)),G_AREA + REAL_TIME_OFF,1);
000003F2  2  IF I = 0 THEN
000003FA  2      CONFIGURATION.REAL_TIME := FALSE
00000402  2  ELSE
00000402  2      CONFIGURATION.REAL_TIME := TRUE;
00000408  2  CONFIGURATION.COUNT_TIME := TRUE;
0000040E  2  CONFIGURATION.BREAK_MEAS_COMP := FALSE;
00000412  2  CONFIGURATION.ENABLE_INB.DRIVE := NO_WAY_JOSE;
00000416  2  CONFIGURATION.ENABLE_INB.RECEIVE := NO_WAY_JOSE;
0000041A  2  CONFIGURATION.DISABLE_INB.DRIVE := NO_WAY_JOSE;
0000041E  2  CONFIGURATION.DISABLE_INB.RECEIVE := NO_WAY_JOSE;
00000422  2  CONFIGURATION.RUN_AT_EXEC := FALSE;            {do not run at execution}
00000426  2  CONFIGURATION.WINDOW := FALSE;                 {no window defined}
0000042A  2  BPC_READ(PTR(ADDR(CONFIGURATION.ABS_FILE)),G_AREA + ABS_FILE_OFF,8);
00000446  2  BPC_READ(PTR(ADDR(CONFIGURATION.ABS_DISC)),G_AREA + ABS_DISC_OFF,1);
00000462  2  BPC_READ(PTR(ADDR(CONFIGURATION.EMUL_ID)),G_AREA + EMUL_ID_OFF,1);
0000047C  2  BPC_READ(PTR(ADDR(CONFIGURATION.EMUL_FILE)),G_AREA + EMUL_FILE_OFF,8);
00000498  2  BPC_READ(PTR(ADDR(CONFIGURATION.EMUL_DISC)),G_AREA + EMUL_DISC_OFF,1);
000004B4  2  FOR I := 0 TO 12 DO
000004B8  2      CURRENT_FORMATS[I]^ := DEFAULT_FORMATS[I]^;
000004EC  2  CURRENT_DISPLAY := Setup;
000004F2  2  VALID_FOOTDC := FALSE;
000004F6  2  DISPLAY.COMMAND := 0;
000004FA  2  DISPLAY.HOLD_DISPLAY := FALSE;
000004FE  2  DISPLAY.HORIZONTAL := 0;
00000502  2  DISPLAY_SOMETHING(Current,FALSE);
00000510  2  DISPLAY_MASTER.DUMMY := FALSE;  {(============================ debug }
00000514  2  DISPLAY_MASTER.BASE := DEFAULT;
0000051A  2  {APPLY_STACK := A_TOKEN_PTR(1010H);           }
0000051A  2  {APPLY_STACK^.APPLY := -1;    {clear apply stack}
0000051A  2  CDS.COMMAND := -1;
00000520  2  CDS.INB_REQUEST := 0;
00000524  2  CDS.HARDWARE_STATUS := 0;
00000528  2  END;
00000000  1  .

End of compilation, number of errors=    0

00000000  1  "68000" PREPROCESS
00000000  1  $BASE_PAGE$
00000000  1  $WIDTH 120$
00000000  1
00000000  1  PROGRAM DB_UTL_;
00000000  1
00000000  1  $EXTENSIONS ON$
00000000  1  $LIB_ABS_LONG$
00000000  1  $WARN OFF$
00000000  1
00000000  1  TYPE
00000000  1      INT = SIGNED_16;
00000000  1      INT_PTR = ^ INT;
00000000  1      PTR = ^ INTEGER;
00000000  1      VECTOR0_7 = ARRAY[0..7] OF INT;
00000000  1      DOUBLE_WORD = RECORD
00000000  2                  LSW : INT;
00000000  2                  MSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE ICMD_DATA:SODAMON
00000000  1  #INCLUDE ISPEC_DATA:SODAMON
00000000  1  #INCLUDE IDATA_BASE:SODAMON
```

```
00000000  1
00000000  1  VAR
00000000  1  $EXTVAR+$
00000000  1     SEMANTIC_ERROR : INT;
00000000  1  $EXTVAR-$
00000000  1
00000000  1  $CALL_ABS_LONG ON$
00000000  1  PROCEDURE OUTIT(L:CHAR;V:INT;D:CHAR); EXTERNAL;
00000000  1  FUNCTION  CMP_IDENT(VAR ID1, ID2 : VECTORO_7) : BOOLEAN; EXTERNAL;
00000000  1  PROCEDURE FIND_SYM(PPTR : PATH_PTR; SPTR : SMALL_SYMBUFF_PTR; VAR SYMTYPE : SYMSET;
00000000  2                      VAR LENGTH, ERROR : INT); EXTERNAL;
00000000  1  PROCEDURE PARENT(PROGNO, SUBNO : INT; VAR PARENTNO : INT; PATH : PATH_PTR; VAR ERROR : INT); EXTERNAL;
00000000  1  $CALL_PC_SHORT ON$
00000000  1  FUNCTION  DB_ERROR(ERROR : INT) : BOOLEAN; EXTERNAL;
00000000  1  PROCEDURE INCREMENT_STACK(VAR STACK : SPECABLE_TYPE_PTR); EXTERNAL;
00000000  1  PROCEDURE SYSTEM_MESSAGE(MESS_NUM, MESS_CODE : INT; MESSAGE : MESSAGE_TYPES); EXTERNAL;
00000000  1  PROCEDURE SYMBOL_MESSAGE(MESS_NUM : INT; VAR IDENT : VECTORO_7; MESSAGE : MESSAGE_TYPES); EXTERNAL;
00000000  1
00000000  1  $GLOBPROC+$
00000000  1
00000000  1  FUNCTION  BUILD_OFFSET(GEN : GENERIC_PTR; VAR_STACK_PTR : SPECABLE_TYPE_PTR; INDIRECT : BOOLEAN;
00000000  2                        VAR SYMBOL : VECTORO_7; VAR CMD_ELEMENT : CMD_DATA_TYPE) : BOOLEAN;
00000001  2  VAR
00000001  2     TEMP_PTR : INT_PTR;        {its here to reduce recursive stack size}
00000006  2     VAR_OFFSET : INTEGER;
0000000A  2     FOUND : BOOLEAN;
0000000B  2     ERROR : BOOLEAN;
0000000C  2     CMD_ELEMENT_NDX : INT;
0000000E  2     I : INT;
00000000  2
00000000  2  PROCEDURE INC_PTR(VAR THE_PTR : INT);
00000000  3  VAR
00000000  3     T1 : INTEGER;
00000004  3  BEGIN
00000004  3  T1 := INTEGER(ADDR(THE_PTR));
0000000C  3  GEN.GENERIC := SHIFT(THE_PTR,+1) + T1;
00000022  3  END;
00000000  2
00000000  2  PROCEDURE ADD_OFFSET(SIZE : INTEGER);
0000002A  3  BEGIN
0000002A  3  IF CMD_ELEMENT_NDX < 8 THEN
0000002A  3      BEGIN
0000003A  3      CMD_ELEMENT.OFFSETS[CMD_ELEMENT_NDX] := VAR_OFFSET;
0000004A  3      CMD_ELEMENT.SIZES[CMD_ELEMENT_NDX] := SIZE;
00000062  3      CMD_ELEMENT_NDX := CMD_ELEMENT_NDX + 1;
0000006A  3      VAR_OFFSET := 0;
0000006E  3      END
00000072  3  ELSE
00000072  3      BEGIN
00000072  3      FOUND := TRUE;
0000007C  3      SEMANTIC_ERROR := 12;
00000082  3      END;
00000082  3  END;
00000000  2
00000000  2  FUNCTION GET_SIZE(GEN : GENERIC_PTR) : INTEGER;
0000008A  3  BEGIN
0000008A  3  GET_SIZE := INTEGER(GEN.AN_INTEGER^.SIZE);
00000093  3  END;
00000000  2
00000000  2  FUNCTION NEXT_REC(VAR THIS_PTR : INT) : GENERIC_PTR;
00000004  3  VAR
00000004  3     T1 : INTEGER;
000000A4  3  BEGIN
000000A4  3  T1 := INTEGER(ADDR(THIS_PTR));
000000AC  3  NEXT_REC := GENERIC_PTR(SHIFT(THIS_PTR,+1) + T1);
000000C4  3  END;
00000000  2
00000000  2  FUNCTION GET_SCALAR(GEN : GENERIC_PTR) : INTEGER;
00000000  3  TYPE
00000000  3     SUBNODE_TYPE = RECORD
00000000  4                 VALUE : INTEGER;
00000000  4                 IDENT : VECTORO_7;
00000000  3                 END;
00000000  3  SUBNODE_PTR = ^ SUBNODE_TYPE;
00000004  3  VAR
```

```
00000004 3       MAX_PTR : SUBNODE_PTR;
00000008 3       TEMP : SUBNODE_PTR;
0000000C 3       SUBRANGE_FLAG : BOOLEAN;
0000000D 3       MIN : INTEGER;
00000012 3       MAX : INTEGER;
00000016 3       RETURN_VALUE : INTEGER;
000000D0 3  BEGIN
000000D0 3  RETURN_VALUE := -1;
000000D8 3  IF GEN.SCALAR^.REC_TYPE = 8 THEN               (subrange)
000000E8 3       BEGIN
000000E8 3       SUBRANGE_FLAG := TRUE;
000000EE 3       MIN := GEN.SUBRANGE^.MIN;
000000F4 3       MAX := GEN.SUBRANGE^.MAX;
000000FA 3       GEN := NEXT_REC(GEN.SUBRANGE^.TYPE_PTR);
0000010A 3       END
0000010E 3  ELSE
0000010E 3       SUBRANGE_FLAG := FALSE;
00000112 3  MAX_PTR := SUBNODE_PTR(INTEGER(GEN) + GEN.SCALAR^.REC_SIZE * 2);
00000128 3  TEMP := SUBNODE_PTR(ADDR(GEN.SCALAR^.SCALAR));
00000130 3  WHILE (TEMP <> MAX_PTR) AND NOT CMP_IDENT(VAR_STACK_PTR^.IDENT,TEMP^.IDENT) DO
00000164 3       BEGIN
00000164 3       TEMP := SUBNODE_PTR(INTEGER(TEMP) + SHIFT(SHIFT(TEMP^.IDENT[0],-13) + 1,+1) + 4);
00000182 3       END;
00000194 3  IF TEMP <> MAX_PTR THEN
00000190 3       IF NOT SUBRANGE_FLAG THEN
00000198 3            RETURN_VALUE := TEMP^.VALUE
000001A4 3       ELSE IF (TEMP^.VALUE >= MIN) AND (TEMP^.VALUE <= MAX) THEN
000001C4 3            RETURN_VALUE := TEMP^.VALUE;
000001C8 3  IF RETURN_VALUE <> -1 THEN
000001D6 3       GET_SCALAR := RETURN_VALUE
000001DE 3  ELSE BEGIN
000001DE 3       ERROR := TRUE;
000001E8 3       END;
000001E8 3  END;
00000000 2
00000000 2  $RECURSIVE+$
00000000 2
00000000 2  PROCEDURE MATCH_VAR(GEN, TAG_GEN : GENERIC_PTR);
000001F4 3  BEGIN
000001F4 3  TEMP_PTR := INT_PTR(GEN);
000001FE 3  IF TEMP_PTR^ <> 0 THEN          (Tom's undocumented sneeky)
00000208 3        WITH GEN DO BEGIN
00000210 3        IF (NOT FOUND) AND (NOT ERROR) THEN
00000226 3             CASE PROC^.REC_TYPE OF
00000234 3
00000234 3               0:   BEGIN             (procedure)
00000234 3                    FOUND := TRUE;
0000023E 3                    ERROR := TRUE;
00000244 3                    END;
00000248 3
00000248 3               1:   BEGIN             (function)
00000248 3                    FOUND := TRUE;
00000252 3                    ERROR := TRUE;
00000258 3                    END;
0000025C 3
0000025C 3               2:   BEGIN             (variable)
0000025C 3                    FOUND := TRUE;
00000266 3                    ERROR := TRUE;
0000026C 3                    END;
00000270 3
00000270 3               3:   BEGIN             (record field pointer)
00000270 3  {                 OUTIT('R',3,'D');              }
00000270 3                    IF VAR_STACK_PTR^.OP_CODE <> SPEC_IDENT THEN
00000282 3                         BEGIN
00000282 3                         ERROR := TRUE;
00000288 3                         END
0000028C 3                    ELSE IF CMP_IDENT(VAR_STACK_PTR^.IDENT,REC_FIELD^.NAME) THEN
000002B0 3                         BEGIN
000002B0 3                         VAR_OFFSET := VAR_OFFSET + REC_FIELD^.OFFSET;
000002C2 3                         INCREMENT_STACK(VAR_STACK_PTR);
000002CC 3                         MATCH_VAR(NEXT_REC(REC_FIELD^.TYPE_PTR),TAG_GEN) (found the field, follow its type)
000002F4 3                         END
```

```
000002F8  3          ELSE {IF REC_FIELD^.NEXT_PTR <> 0 THEN}
000002F8  3               MATCH_VAR(NEXT_REC(REC_FIELD^.NEXT_PTR),TAG_GEN); {check the next field}
00000320  3          END;
00000324  3
00000324  3      4:  BEGIN          {immediate constant}
00000324  3          FOUND := TRUE;
0000032E  3          ERROR := TRUE;
00000334  3          END;
00000338  3
00000338  3      5:  BEGIN          {string constant}
00000338  3          FOUND := TRUE;
00000342  3          ERROR := TRUE;
00000348  3          END;
0000034C  3
0000034C  3      6:  BEGIN          {parameter}
0000034C  3          FOUND := TRUE;
00000356  3          ERROR := TRUE;
0000035C  3          END;
00000360  3
00000360  3      7:  BEGIN          {scalar}
00000360  3  {       OUTIT('R',7,'D');                  }
00000360  3          ADD_OFFSET(SCALAR^.SIZE);
00000378  3          FOUND := TRUE;
00000382  3          END;
00000386  3
00000386  3      8:  BEGIN          {subrange}
00000386  3  {       OUTIT('R',8,'D');                  }
00000386  3          ADD_OFFSET(SUBRANGE^.SIZE);
0000039E  3          FOUND := TRUE;
000003A8  3          END;
000003AC  3
000003AC  3      9:  BEGIN          {pointer}
000003AC  3  {       OUTIT('R',9,'D');                  }
000003AC  3          IF VAR_STACK_PTR^.OP_CODE = SPEC_VEND THEN
000003BE  3               BEGIN
000003BE  3               ADD_OFFSET(POINTER^.SIZE);
000003D6  3               FOUND := TRUE;
000003E0  3               END
000003E4  3          ELSE IF VAR_STACK_PTR^.OP_CODE = SPEC_PTR THEN
000003F2  3               BEGIN
000003F2  3               ADD_OFFSET(POINTER^.SIZE);
0000040A  3               INCREMENT_STACK(VAR_STACK_PTR);
00000418  3               MATCH_VAR(NEXT_REC(POINTER^.TYPE_PTR),TAG_GEN); {follow its type}
00000440  3               END
00000444  3          ELSE BEGIN
00000444  3               ERROR := TRUE;
0000044E  3               END;
0000044E  3          END;
00000452  3
00000452  3     10:  BEGIN          {set}
00000452  3  {       OUTIT('R',10,'D');                 }
00000452  3          ADD_OFFSET(A_SET^.SIZE);
0000046A  3          FOUND := TRUE;
00000474  3          END;
00000478  3
00000478  3     11:  BEGIN          {array}
00000478  3  {       OUTIT('R',11,'D');                 }
00000478  3          IF VAR_STACK_PTR^.OP_CODE = SPEC_VEND THEN
0000048A  3               BEGIN
0000048A  3               ADD_OFFSET(AN_ARRAY^.SIZE);
000004A2  3               FOUND := TRUE;
000004AC  3               END
000004B0  3          ELSE IF VAR_STACK_PTR^.OP_CODE = SPEC_INDEX THEN {integer index}
000004C2  3               BEGIN
000004C2  3               VAR_OFFSET := VAR_OFFSET + (VAR_STACK_PTR^.VALUE - AN_ARRAY^.LOWER) *
000004C2  3                              GET_SIZE(NEXT_REC(AN_ARRAY^.TYPE_PTR));
00000508  3               INCREMENT_STACK(VAR_STACK_PTR);
00000512  3               IF VAR_STACK_PTR^.OP_CODE = SPEC_VEND THEN
00000524  3                    BEGIN
00000524  3                    ADD_OFFSET(GET_SIZE(NEXT_REC(AN_ARRAY^.TYPE_PTR)));
00000550  3                    FOUND := TRUE;
00000554  3                    END
0000055E  3               ELSE BEGIN
0000055E  3                    MATCH_VAR(NEXT_REC(AN_ARRAY^.TYPE_PTR),TAG_GEN); {follow its type}
```

```
00000586  3                        MATCH_VAR(NEXT_REC(AN_ARRAY^.INDEX_PTR),TAG_GEN); {check the index}
000005AE  3                        END;
000005AE  3                    END
000005B2  3                ELSE IF VAR_STACK_PTR^.OP_CODE = SPEC_SCALAR THEN {scalar index}
000005C4  3                    BEGIN
000005C4  3                    VAR_OFFSET := VAR_OFFSET + (GET_SCALAR(NEXT_REC(AN_ARRAY^.INDEX_PTR)) - AN_ARRAY^.LOWER) *
000005C4  3                                      GET_SIZE(NEXT_REC(AN_ARRAY^.TYPE_PTR));
00000622  3                    INCREMENT_STACK(VAR_STACK_PTR);
0000062C  3                    IF (VAR_STACK_PTR^.OP_CODE = SPEC_VEND) OR FOUND THEN
00000648  3                        BEGIN
00000648  3                        ADD_OFFSET(GET_SIZE(NEXT_REC(AN_ARRAY^.TYPE_PTR)));
00000674  3                        FOUND := TRUE;
0000067E  3                        END
00000682  3                    ELSE BEGIN
00000682  3                        MATCH_VAR(NEXT_REC(AN_ARRAY^.TYPE_PTR),TAG_GEN); {follow its type}
000006AA  3                        MATCH_VAR(NEXT_REC(AN_ARRAY^.INDEX_PTR),TAG_GEN); {check the index}
000006D2  3                        END;
000006D2  3                    END
000006D6  3                ELSE BEGIN
000006D6  3                    ERROR := TRUE;
000006E0  3                    END;
000006E0  3                END;
000006E4  3
000006E4  3        12:  BEGIN          {record}
000006E4  3 {           OUTIT('R',12,'D');              }
000006E4  3             IF VAR_STACK_PTR^.OP_CODE = SPEC_VEND THEN
000006F6  3                 BEGIN
000006F6  3                 ADD_OFFSET(A_RECORD^.SIZE);
0000070E  3                 FOUND := TRUE;
00000718  3                 END
0000071C  3             ELSE
0000071C  3                 MATCH_VAR(NEXT_REC(A_RECORD^.FIELD_PTR),TAG_GEN); {check the fields}
00000744  3 { delete    IF NOT FOUND THEN                                                    }
00000744  3 { delete        MATCH_VAR(NEXT_REC(A_RECORD^.TAG_PTR),TAG_GEN);                  }
00000744  3             END;
00000748  3
00000748  3        13:  BEGIN          {tag field}
00000748  3 {           OUTIT('R',13,'D');              }
00000748  3             TAG_GEN := GEN;
0000074E  3             MATCH_VAR(NEXT_REC(TAG^.VARIANT_PTR),TAG_GEN); {check the variant record}
00000776  3             IF NOT FOUND THEN
00000782  3                 MATCH_VAR(NEXT_REC(TAG^.NEXT_PTR),TAG_GEN); {check the next field}
000007AA  3             END;
000007AE  3
000007AE  3        14:  BEGIN          {record variant}
000007AE  3 {           OUTIT('R',14,'D');              }
000007AE  3             TAG_GEN.TAG^.SEL_VALUE := GEN.VARIANT^.SELECT;
000007BC  3             TAG_GEN.TAG^.SEL_FLAG := INT(TRUE);
000007C6  3             MATCH_VAR(NEXT_REC(VARIANT^.FIELD_PTR),TAG_GEN); {check the fields}
000007EE  3 { delete    IF NOT FOUND THEN                                                    }
000007EE  3 { delete        MATCH_VAR(NEXT_REC(VARIANT^.NEXT_PTR),TAG_GEN);                  }
000007EE  3             IF NOT FOUND THEN
000007FA  3                 MATCH_VAR(NEXT_REC(VARIANT^.VARIANT_PTR),TAG_GEN); {check the next variant}
00000822  3             END;
00000826  3
00000826  3        15:  BEGIN          {external procedure}
00000826  3             FOUND := TRUE;
00000830  3             ERROR := TRUE;
00000836  3             END;
0000083A  3
0000083A  3        16:  BEGIN          {real}
0000083A  3 {           OUTIT('R',16,'D');              }
0000083A  3             ADD_OFFSET(REAL^.SIZE);
00000852  3             FOUND := TRUE;
0000085C  3             END;
00000860  3
00000860  3        17:  BEGIN          {char}
00000860  3 {           OUTIT('R',17,'D');              }
00000860  3             ADD_OFFSET(A_CHAR^.SIZE);
00000878  3             FOUND := TRUE;
00000882  3             END;
00000886  3
00000886  3        18:  BEGIN          {integer}
00000886  3 {           OUTIT('R',18,'D');              }
00000886  3             ADD_OFFSET(AN_INTEGER^.SIZE);
```

```
0000089E  3                   FOUND := TRUE;
000008A8  3                   END;
000008AC  3
000008AC  3              19:  BEGIN          (bit field)
000008AC  3  {                OUTIT('R',19,'D');            }
000008AC  3                   ADD_OFFSET(BIT_FIELD^.SIZE);
000008C4  3                   FOUND := TRUE;
000008CE  3                   END;
000008D2  3
000008D2  3              20:  BEGIN          (function return value)
000008D2  3                   FOUND := TRUE;
000008DC  3                   ERROR := TRUE;
000008E2  3                   END;
000008E6  3
000008E6  3              21:  BEGIN          (file)
000008E6  3                   FOUND := TRUE;
000008F0  3                   ERROR := TRUE;
000008F6  3                   END;
000008FA  3
000008FA  3              OTHERWISE SYSTEM_MESSAGE(611,INT(PROC^.REC_TYPE),Error);
00000916  3
00000916  3              END;
00000960  3         END;
00000960  3  END;
00000968  2
00000968  2  BEGIN  (BUILD_OFFSET)
00000968  2  { skip the variable, get to the sub-fields }
00000968  2  INCREMENT_STACK(VAR_STACK_PTR);
00000972  2  CMD_ELEMENT.OP_CODE := OFFSET;
0000097A  2  FOR I := 0 TO 8 DO
0000097E  2      BEGIN
0000097E  2      CMD_ELEMENT.OFFSETS[I] := -1;
00000994  2      CMD_ELEMENT.SIZES[I] := -1;
000009AA  2      END;
000009BA  2  FOR I := 0 TO 2 DO
000009BE  2      CMD_ELEMENT.DUMMY4[I] := 0;
000009E0  2  CMD_ELEMENT_NDX := 0;
000009E4  2  VAR_OFFSET := GEN.VARIABLE^.ADDRESS;
000009EE  2  IF INDIRECT THEN
000009F6  2      BEGIN
000009F6  2      CMD_ELEMENT.OFFSETS[CMD_ELEMENT_NDX] := GEN.VARIABLE^.ADDRESS;
00000A0A  2      CMD_ELEMENT.SIZES[CMD_ELEMENT_NDX] := GEN.VARIABLE^.SIZE;
00000A22  2      VAR_OFFSET := 0;
00000A26  2      CMD_ELEMENT_NDX := 1;
00000A2C  2      END;
00000A2C  2  INC_PTR(GEN.VARIABLE^.TYPE_PTR);
00000A3E  2  FOUND := FALSE;
00000A42  2  ERROR := FALSE;
00000A46  2  MATCH_VAR(GEN,GEN);
00000A5C  2  IF (FOUND) AND (NOT ERROR) AND (VAR_STACK_PTR^.OP_CODE = SPEC_VEND) THEN
00000A80  2      BUILD_OFFSET := TRUE
00000A8A  2  ELSE
00000A8A  2      BEGIN
00000A8A  2      BUILD_OFFSET := FALSE;
00000A8E  2      IF (NOT FOUND) AND (NOT ERROR) THEN
00000AA4  2          SYMBOL_MESSAGE(11,SYMBOL,Error)
00000ABC  2      ELSE IF (FOUND) AND (ERROR) THEN
00000AC8  2          SYMBOL_MESSAGE(56,SYMBOL,Error)
00000AE0  2      ELSE
00000AE0  2          SYMBOL_MESSAGE(54,SYMBOL,Error);
00000AF4  2      END;
00000AF4  2  (*************
00000AF4  2  IF (NOT FOUND) OR (VAR_STACK_PTR^.OP_CODE <> SPEC_VEND) OR (ERROR) THEN
00000AF4  2      BUILD_OFFSET := FALSE
00000AF4  2  ELSE
00000AF4  2      BUILD_OFFSET := TRUE;
00000AF4  2  *************)
00000AF4  2  END;
00000000  1
00000000  1  PROCEDURE BUILD_PARENTS(PATH : PATH_PTR; VAR CMD_ELEMENT : CMD_DATA_TYPE);
00000000  2  LABEL 1;
00000000  2  VAR
00000000  2      GEN : GENERIC_PTR;
00000004  2      PARENT_NUM : INT;
```

```
00000006  2        SYMBOL : SMALL_SYMBUFF_PTR;
0000000A  2        SYMBOL_TYPE : SYMSET;
0000000B  2        LENGTH : INT;
0000000E  2        ERROR : INT;
00000010  2        I : INT;
00000B02  2  BEGIN
00000B02  2  CMD_ELEMENT.OP_CODE := PARENTS;
00000B0A  2  FOR I := 0 TO 14 DO
00000B0E  2       BEGIN
00000B0E  2       CMD_ELEMENT.PROC_NUMS[I] := -1;
00000B22  2       CMD_ELEMENT.STACK_OFFS[I] := -1;
00000B36  2       END;
00000B46  2  FOR I := 0 TO 8 DO
00000B4A  2       CMD_ELEMENT.DUMMY5[I] := 0;
00000B6C  2  I := 0;
00000B70  2  NEW(SYMBOL);
00000B82  2  GEN.GENERIC := INTEGER(SYMBOL);
00000B88  2  ERROR := 0;
00000B8C  2  PARENT_NUM := PATH^.PROC_NUM;
00000B96  2  PATH^.PROC_NUM := 0;
00000B9A  2  WHILE ERROR = 0 DO
00000BA2  2       BEGIN
00000BA2  2       IF PARENT_NUM <> 0 THEN
00000BAA  2            BEGIN
00000BAA  2            LENGTH := SMALL_SYMBUFF_SIZE;
00000BB0  2            FIND_SYM(PATH,SYMBOL,SYMBOL_TYPE,LENGTH,ERROR);
00000BD0  2            IF DB_ERROR(ERROR) THEN
00000BE0  2                 BEGIN
00000BE0  2                 SYSTEM_MESSAGE(621,ERROR,Error);
00000BF2  2                 GOTO 1; {error trapped}
00000BF6  2                 END;
00000BF6  2            IF SYMBOL_TYPE = Prog THEN
00000BFE  2                 BEGIN
00000BFE  2                 CMD_ELEMENT.PROC_NUMS[I] := 0;
00000C10  2                 CMD_ELEMENT.STACK_OFFS[I] := 0;
00000C22  2                 ERROR := 1;
00000C28  2                 END
00000C2C  2            ELSE BEGIN
00000C2C  2                 GEN.GENERIC := INTEGER(SYMBOL);
00000C32  2                 CMD_ELEMENT.PROC_NUMS[I] := PARENT_NUM;
00000C46  2                 CMD_ELEMENT.STACK_OFFS[I] := GEN.PROC^.STATIC;
00000C5E  2                 I := I + 1;
00000C62  2                 PARENT(PATH^.PROC_NUM,PARENT_NUM,PARENT_NUM,PATH,ERROR);
00000C86  2                 IF DB_ERROR(ERROR) THEN
00000C96  2                      BEGIN
00000C96  2                      SYSTEM_MESSAGE(622,ERROR,Error);
00000CA8  2                      GOTO 1; {error trapped}
00000CAC  2                      END;
00000CAC  2                 END;
00000CAC  2            END
00000CB0  2       ELSE BEGIN
00000CB0  2            CMD_ELEMENT.PROC_NUMS[I] := 0;
00000CC2  2            CMD_ELEMENT.STACK_OFFS[I] := 0;
00000CD4  2            ERROR := 1;
00000CDA  2            END;
00000CDA  2  1 : END;
00000CDE  2  DISPOSE(SYMBOL);
00000CF0  2  END;
00000000  1  .

End of compilation, number of errors=     0

00000000  1  "68000" PREPROCESS
00000000  1  $BASE_PAGE$
00000000  1  $WIDTH 120$
00000000  1
00000000  1  PROGRAM DEBUG_;
00000000  1
00000000  1  $EXTENSIONS ON$
00000000  1  $LIB_ABS_LONG$
00000000  1  $WARN OFF$
00000000  1
00000000  1  CONST
00000000  1       MAX_LINE_CT = 14;
```

```
00000000  1
00000000  1  TYPE
00000000  1      INT = SIGNED_16;
00000000  1      PTR = ^ INTEGER;
00000000  1      WPTR = ^ INT;
00000000  1      BPTR = ^ BYTE;
00000000  1      VECTORO_7 = ARRAY[0..7] OF INT;
00000000  1      BUFFER = ARRAY[-1..79] OF INT;
00000000  1      BUFFER_PTR = ^ BUFFER;
00000000  1      DOUBLE_WORD = RECORD
00000000  2                  MSW : INT;
00000000  2                  LSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE ICMD_DATA:SODAMON
00000000  1  #INCLUDE ISPEC_DATA:SODAMON
00000000  1  #INCLUDE IDISPLAY:SODAMO
00000000  1
00000000  1  VAR
00000000  1  $EXTVAR+$
00000000  1  $FAR$
00000000  1      CMD_SYMBOLS : ARRAY[0..1] OF WPTR;
00000000  1      SPEC_SYMBOLS : ARRAY[0..1] OF WPTR;
00000000  1  $BASE_PAGE$
00000000  1      MEAS_SETUP : CMD_ARRAY;
00000000  1      CMD_STACK : CMD_ARRAY_PTR;
00000000  1      FILE_NAME : VECTORO_7;
00000000  1      FILE_DISC : INT;
00000000  1      FILE_DCB : INT;
00000000  1      CODE_REV : INT;
00000000  1      SUBS_DATE : INTEGER;
00000000  1      DEBUG : DEBUG_TYPE;
00000000  1  $EXTVAR-$
00000000  1
00000000  1  $CALL_ABS_LONG ON$
00000000  1  PROCEDURE OUTIT(L :  CHAR; V : INT; B : CHAR); EXTERNAL;
00000000  1  PROCEDURE OUTPUT_SCREEN(VAR DISPLAY : DISPLAY_TYPE); EXTERNAL;
00000000  1  PROCEDURE OUTPUT_LINE(VAR DISPLAY : DISPLAY_TYPE); EXTERNAL;
00000000  1  PROCEDURE FORMAT (SIGNED:BOOLEAN; SOURCE:BPTR; SOURCESIZE:INT;
00000000  2                   DEST:PTR; VAR DESTSIZE:INT; BASE:INT; JUSTIFY:INT); EXTERNAL;
00000000  1  PROCEDURE INCREMENT_STACK(VAR STACK : SPECABLE_TYPE_PTR); EXTERNAL;
00000000  1  PROCEDURE ERASE_LINE(VAR DISPLAY : DISPLAY_TYPE); EXTERNAL;
00000000  1  PROCEDURE FMT_INTEGER(VAR DISPLAY : DISPLAY_TYPE; SOURCE : INTEGER;
00000000  2                       BASE : INT; LAST_COL : INT; SPACE : BOOLEAN); EXTERNAL;
00000000  1  PROCEDURE FMT_KEYWORD(VAR DISPLAY : DISPLAY_TYPE;
00000000  2                       WORD_PTR : WPTR; LAST_COL : INT; SPACE : BOOLEAN); EXTERNAL;
00000000  1  PROCEDURE FMT_IDENT(VAR DISPLAY : DISPLAY_TYPE;
00000000  2                     VAR IDENT : VECTORO_7; LAST_COL : INT; SPACE : BOOLEAN); EXTERNAL;
00000000  1  PROCEDURE FMT_FILE(VAR DISPLAY : DISPLAY_TYPE;
00000000  2                    VAR NAME : VECTORO_7; DISC : INT;
00000000  2                    LAST_COL : INT; SPACE : BOOLEAN); EXTERNAL;
00000000  1  $CALL_PC_SHORT ON$
00000000  1  PROCEDURE SYSTEM_MESSAGE(MESS_NUM, MESS_CODE : INT; MESSAGE : MESSAGE_TYPES); EXTERNAL;
00000000  1
00000000  1  PROCEDURE FORMAT_SPEC_STACK(VAR DISPLAY : DISPLAY_TYPE; STACK : SPECABLE_TYPE_PTR);
00000000  2  VAR
00000000  2  $EXTVAR+$
00000000  2  $FAR$
00000000  2      pointer : PTR;
00000000  2      length : PTR;
00000000  2      value : PTR;
00000000  2      base : PTR;
00000000  2      address : PTR;
00000000  2      mask : PTR;
00000000  2      ident : PTR;
00000000  2      disc : PTR;
00000000  2      operand : PTR;
00000000  2      file : PTR;
00000000  2  $BASE_PAGE$
00000000  2  $EXTVAR-$
```

```
00000000  2      DONE : BOOLEAN;
00000004  2  BEGIN
00000004  2  WITH DISPLAY DO BEGIN
0000000C  2  FMT_INTEGER(DISPLAY,INTEGER(STACK),16,LINE_SIZE,FALSE);
0000002C  2  OUTPUT_LINE(DISPLAY);
0000003A  2  OUTPUT_LINE(DISPLAY);
00000048  2  DONE := FALSE;
0000004C  2  IF STACK <> NIL THEN
00000054  2  REPEAT
00000054  2      OUTPUT_LINE(DISPLAY);
00000062  2      FMT_KEYWORD(DISPLAY,SPEC_SYMBOLS[INT(STACK^.OP_CODE)],LINE_SIZE,FALSE);
0000008C  2      OUTPUT_LINE(DISPLAY);
0000009A  2      COLUMN := 5;
000000A4  2      FMT_KEYWORD(DISPLAY,length,LINE_SIZE,TRUE);
000000C4  2      FMT_INTEGER(DISPLAY,STACK^.LENGTH,10,LINE_SIZE,FALSE);
000000EC  2      OUTPUT_LINE(DISPLAY);
000000FA  2      CASE STACK^.OP_CODE OF
00000106  2          SPEC_PTR : BEGIN            {^, ->, *}
00000106  2              COLUMN := 5;
00000110  2              FMT_KEYWORD(DISPLAY,pointer,LINE_SIZE,TRUE);
00000130  2              FMT_INTEGER(DISPLAY,STACK^.OPERAND,10,LINE_SIZE,FALSE);
00000158  2              OUTPUT_LINE(DISPLAY);
00000166  2              END;
0000016A  2          SPEC_END,                   {end of spec stack}
0000016A  2          SPEC_VEND : BEGIN           {end of variable sub-stack}
0000016A  2              END;
0000016E  2          SPEC_LINE,                  {line}
0000016E  2          SPEC_INDEX : BEGIN          {numeric index}
0000016E  2              COLUMN := 5;
00000178  2              FMT_KEYWORD(DISPLAY,value,LINE_SIZE,TRUE);
00000198  2              FMT_INTEGER(DISPLAY,STACK^.VALUE,10,LINE_SIZE,FALSE);
000001BC  2              OUTPUT_LINE(DISPLAY);
000001CA  2              END;
000001CE  2          SPEC_VALUE : BEGIN          {value}
000001CE  2              COLUMN := 5;
000001D8  2              FMT_KEYWORD(DISPLAY,value,LINE_SIZE,TRUE);
000001F8  2              FMT_INTEGER(DISPLAY,STACK^.VALUE,10,LINE_SIZE,FALSE);
0000021C  2              OUTPUT_LINE(DISPLAY);
0000022A  2              COLUMN := 5;
00000234  2              FMT_KEYWORD(DISPLAY,base,LINE_SIZE,TRUE);
00000254  2              FMT_INTEGER(DISPLAY,STACK^.BASE,10,LINE_SIZE,FALSE);
0000027C  2              OUTPUT_LINE(DISPLAY);
0000028A  2              END;
0000028E  2          SPEC_DXVAL : BEGIN          {done_care value}
0000028E  2              COLUMN := 5;
00000298  2              FMT_KEYWORD(DISPLAY,value,LINE_SIZE,TRUE);
000002B8  2              FMT_INTEGER(DISPLAY,STACK^.VALUE,16,LINE_SIZE,FALSE);
000002DC  2              OUTPUT_LINE(DISPLAY);
000002EA  2              COLUMN := 5;
000002F4  2              FMT_KEYWORD(DISPLAY,mask,LINE_SIZE,TRUE);
00000314  2              FMT_INTEGER(DISPLAY,STACK^.MASK,16,LINE_SIZE,FALSE);
00000338  2              OUTPUT_LINE(DISPLAY);
00000346  2              END;
0000034A  2          SPEC_SCALAR,                {scalar index}
0000034A  2          SPEC_IDENT,                 {identifier}
0000034A  2          SPEC_PROC,                  {path_proc_name}
0000034A  2          SPEC_SYMBOL,                {symbol}
0000034A  2          SPEC_MODULE : BEGIN         {module}
0000034A  2              COLUMN := 5;
00000354  2              FMT_KEYWORD(DISPLAY,ident,LINE_SIZE,TRUE);
00000374  2              FMT_IDENT(DISPLAY,STACK^.IDENT,LINE_SIZE,FALSE);
00000394  2              OUTPUT_LINE(DISPLAY);
000003A2  2              END;
000003A6  2          SPEC_FILE : BEGIN           {path_file_name}
000003A6  2              COLUMN := 5;
000003B0  2              FMT_KEYWORD(DISPLAY,file,LINE_SIZE,TRUE);
000003D0  2              FMT_FILE(DISPLAY,STACK^.IDENT,STACK^.DISC,LINE_SIZE,FALSE);
000003F4  2              OUTPUT_LINE(DISPLAY);
00000402  2              END;
00000406  2          SPEC_OPERAND : BEGIN        {operand}
00000406  2              COLUMN := 5;
00000410  2              FMT_KEYWORD(DISPLAY,operand,LINE_SIZE,TRUE);
00000430  2              FMT_INTEGER(DISPLAY,STACK^.OPERAND,10,LINE_SIZE,FALSE);
00000458  2              OUTPUT_LINE(DISPLAY);
00000466  2              END;
```

```
0000046A  2            SPEC_ADDRESS : BEGIN        {address}
0000046A  2                COLUMN := 5;
00000474  2                FMT_KEYWORD(DISPLAY,address,LINE_SIZE,TRUE);
00000494  2                FMT_INTEGER(DISPLAY,STACK^.VALUE,16,LINE_SIZE,FALSE);
000004B8  2                OUTPUT_LINE(DISPLAY);
000004C6  2                COLUMN := 5;
000004D0  2                FMT_KEYWORD(DISPLAY,base,LINE_SIZE,TRUE);
000004F0  2                FMT_INTEGER(DISPLAY,STACK^.BASE,10,LINE_SIZE,FALSE);
00000518  2                OUTPUT_LINE(DISPLAY);
00000526  2                END;
0000052A  2            OTHERWISE SYSTEM_MESSAGE(911,INT(STACK^.OP_CODE),Error);
0000053E  2            END;
0000057C  2        IF STACK^.OP_CODE = SPEC_END THEN
0000053A  2            DONE := TRUE;
00000590  2        INCREMENT_STACK(STACK);
0000059C  2        UNTIL DONE;
000005A4  2    END;
000005A4  2    END;
00000000  1
00000000  1    PROCEDURE FORMAT_CMD_STACK(VAR DISPLAY : DISPLAY_TYPE; STACK : CMD_ARRAY_PTR);
00000000  2    VAR
00000000  2    $EXTVAR+$
00000000  2    $FAR$
00000000  2        proc_num : PTR;
00000000  2        file_num : PTR;
00000000  2        flags : PTR;
00000000  2        status : PTR;
00000000  2        line_1 : PTR;
00000000  2        line_2 : PTR;
00000000  2        proc_name : PTR;
00000000  2        file_name : PTR;
00000000  2        address : PTR;
00000000  2        size : PTR;
00000000  2        entry : PTR;
00000000  2        exit : PTR;
00000000  2        en_offset : PTR;
00000000  2        ex_offset : PTR;
00000000  2        db_ptr : PTR;
00000000  2        db_length : PTR;
00000000  2        language : PTR;
00000000  2        adrs : PTR;
00000000  2        adrs_mask : PTR;
00000000  2        data : PTR;
00000000  2        data_mask : PTR;
00000000  2        stat : PTR;
00000000  2        stat_mask : PTR;
00000000  2        val_value : PTR;
00000000  2        rel_op : PTR;
00000000  2        offsets : PTR;
00000000  2        sizes : PTR;
00000000  2        proc_nums : PTR;
00000000  2        stack_offs : PTR;
00000000  2    $BASE_PAGE$
00000000  2    $EXTVAR-$
00000000  2        INDEX : INT;
00000002  2        I : INT;
000005AC  2    BEGIN
000005AC  2    FMT_INTEGER(DISPLAY,INTEGER(STACK),16,LINE_SIZE,FALSE);
000005CC  2    OUTPUT_LINE(DISPLAY);
000005DA  2    OUTPUT_LINE(DISPLAY);
000005E8  2    WITH DISPLAY DO BEGIN
000005F0  2    INDEX := -1;
000005F6  2    IF STACK <> NIL THEN
000005FE  2    REPEAT
000005FE  2        INDEX := INDEX + 1;
00000602  2        FMT_KEYWORD(DISPLAY,CMD_SYMBOLS[INT(STACK^[INDEX].OP_CODE)],LINE_SIZE,FALSE);
00000638  2        OUTPUT_LINE(DISPLAY);
00000646  2        CASE STACK^[INDEX].OP_CODE OF
0000065C  2            VAR_OP,
0000065C  2            PROC_OP,
0000065C  2            LINE_OP,
0000065C  2            FILE_OP : BEGIN
0000065C  2                COLUMN := 5;
00000666  2                FMT_KEYWORD(DISPLAY,proc_name,LINE_SIZE,FALSE);
```

```
00000684 2   COLUMN := 15;
0000068E 2   FMT_IDENT(DISPLAY,STACK^[INDEX].PROC_NAME,LINE_SIZE,FALSE);
000006BA 2   COLUMN := 40;
000006C4 2   FMT_KEYWORD(DISPLAY,proc_num,LINE_SIZE,FALSE);
000006E2 2   COLUMN := 50;
000006EC 2   FMT_INTEGER(DISPLAY,INTEGER(STACK^[INDEX].PROC_NUM),10,LINE_SIZE,FALSE);
00000720 2   OUTPUT_LINE(DISPLAY);
0000072E 2   COLUMN := 5;
00000738 2   FMT_KEYWORD(DISPLAY,file_name,LINE_SIZE,FALSE);
00000756 2   COLUMN := 15;
00000760 2   FMT_FILE(DISPLAY,STACK^[INDEX].FILE_NAME,STACK^[INDEX].DISC_NUM,LINE_SIZE,FALSE);
0000079C 2   COLUMN := 40;
000007A6 2   FMT_KEYWORD(DISPLAY,file_num,LINE_SIZE,FALSE);
000007C4 2   COLUMN := 50;
000007CE 2   FMT_INTEGER(DISPLAY,INTEGER(STACK^[INDEX].FILE_NUM),10,LINE_SIZE,FALSE);
00000802 2   OUTPUT_LINE(DISPLAY);
00000810 2   COLUMN := 5;
0000081A 2   FMT_KEYWORD(DISPLAY,flags,LINE_SIZE,FALSE);
00000838 2   COLUMN := 15;
00000842 2   FMT_INTEGER(DISPLAY,INTEGER(STACK^[INDEX].FLAGS),8,LINE_SIZE,FALSE);
00000876 2   COLUMN := 40;
00000880 2   FMT_KEYWORD(DISPLAY,status,LINE_SIZE,FALSE);
0000089E 2   COLUMN := 50;
000008A8 2   FMT_INTEGER(DISPLAY,INTEGER(STACK^[INDEX].STATUS),8,LINE_SIZE,FALSE);
000008DC 2   OUTPUT_LINE(DISPLAY);
000008EA 2   COLUMN := 5;
000008F4 2   FMT_KEYWORD(DISPLAY,line_1,LINE_SIZE,FALSE);
00000912 2   COLUMN := 15;
0000091C 2   FMT_INTEGER(DISPLAY,INTEGER(STACK^[INDEX].LINE1),10,LINE_SIZE,FALSE);
00000950 2   COLUMN := 40;
0000095A 2   FMT_KEYWORD(DISPLAY,line_2,LINE_SIZE,FALSE);
00000978 2   COLUMN := 50;
00000982 2   FMT_INTEGER(DISPLAY,INTEGER(STACK^[INDEX].LINE2),10,LINE_SIZE,FALSE);
000009B6 2   OUTPUT_LINE(DISPLAY);
000009C4 2   COLUMN := 5;
000009CE 2   FMT_KEYWORD(DISPLAY,address,LINE_SIZE,FALSE);
000009EC 2   COLUMN := 15;
000009F6 2   FMT_INTEGER(DISPLAY,STACK^[INDEX].ADDRESS,16,LINE_SIZE,FALSE);
00000A26 2   COLUMN := 40;
00000A30 2   FMT_KEYWORD(DISPLAY,size,LINE_SIZE,FALSE);
00000A4E 2   COLUMN := 50;
00000A58 2   FMT_INTEGER(DISPLAY,STACK^[INDEX].SIZE,16,LINE_SIZE,FALSE);
00000A88 2   OUTPUT_LINE(DISPLAY);
00000A96 2   COLUMN := 5;
00000AA0 2   FMT_KEYWORD(DISPLAY,entry,LINE_SIZE,FALSE);
00000ABE 2   COLUMN := 15;
00000AC8 2   FMT_INTEGER(DISPLAY,STACK^[INDEX].ENTRY,16,LINE_SIZE,FALSE);
00000AF8 2   COLUMN := 40;
00000B02 2   FMT_KEYWORD(DISPLAY,exit,LINE_SIZE,FALSE);
00000B20 2   COLUMN := 50;
00000B2A 2   FMT_INTEGER(DISPLAY,STACK^[INDEX].EXIT,16,LINE_SIZE,FALSE);
00000B5A 2   OUTPUT_LINE(DISPLAY);
00000B68 2   COLUMN := 5;
00000B72 2   FMT_KEYWORD(DISPLAY,en_offset,LINE_SIZE,FALSE);
00000B90 2   COLUMN := 15;
00000B9A 2   FMT_INTEGER(DISPLAY,STACK^[INDEX].ENTRY_OFFSET,16,LINE_SIZE,FALSE);
00000BCE 2   COLUMN := 40;
00000BD8 2   FMT_KEYWORD(DISPLAY,ex_offset,LINE_SIZE,FALSE);
00000BF6 2   COLUMN := 50;
00000C00 2   FMT_INTEGER(DISPLAY,STACK^[INDEX].EXIT_OFFSET,16,LINE_SIZE,FALSE);
00000C34 2   OUTPUT_LINE(DISPLAY);
00000C42 2   COLUMN := 5;
00000C4C 2   FMT_KEYWORD(DISPLAY,db_ptr,LINE_SIZE,FALSE);
00000C6A 2   COLUMN := 15;
00000C74 2   FMT_INTEGER(DISPLAY,STACK^[INDEX].DB_PTR,16,LINE_SIZE,FALSE);
00000CA4 2   COLUMN := 40;
00000CAE 2   FMT_KEYWORD(DISPLAY,db_length,LINE_SIZE,FALSE);
00000CCC 2   COLUMN := 50;
00000CD6 2   FMT_INTEGER(DISPLAY,STACK^[INDEX].DB_LENGTH,16,LINE_SIZE,FALSE);
00000D0A 2   OUTPUT_LINE(DISPLAY);
00000D18 2   COLUMN := 5;
00000D22 2   FMT_KEYWORD(DISPLAY,language,LINE_SIZE,FALSE);
00000D40 2   COLUMN := 15;
00000D4A 2   FMT_INTEGER(DISPLAY,STACK^[INDEX].LANGUAGE,16,LINE_SIZE,FALSE);
```

```
00000D7E  2              OUTPUT_LINE(DISPLAY);
00000D8C  2              END;
00000D90  2          STATE_OP : BEGIN
00000D90  2              COLUMN := 5;
00000D9A  2              FMT_KEYWORD(DISPLAY,adrs,LINE_SIZE,FALSE);
00000DB8  2              COLUMN := 15;
00000DC2  2              FMT_INTEGER(DISPLAY,STACK^[INDEX].ADRS,16,LINE_SIZE,FALSE);
00000DF2  2              COLUMN := 30;
00000DFC  2              FMT_KEYWORD(DISPLAY,data,LINE_SIZE,FALSE);
00000E1A  2              COLUMN := 40;
00000E24  2              FMT_INTEGER(DISPLAY,STACK^[INDEX].DATA,16,LINE_SIZE,FALSE);
00000E58  2              COLUMN := 55;
00000E62  2              FMT_KEYWORD(DISPLAY,stat,LINE_SIZE,FALSE);
00000E80  2              COLUMN := 65;
00000E8A  2              FMT_INTEGER(DISPLAY,STACK^[INDEX].STAT,2,LINE_SIZE,FALSE);
00000EBE  2              OUTPUT_LINE(DISPLAY);
00000ECC  2              COLUMN := 5;
00000ED6  2              FMT_KEYWORD(DISPLAY,adrs_mask,LINE_SIZE,FALSE);
00000EF4  2              COLUMN := 15;
00000EFE  2              FMT_INTEGER(DISPLAY,STACK^[INDEX].ADRSMASK,16,LINE_SIZE,FALSE);
00000F2E  2              COLUMN := 30;
00000F38  2              FMT_KEYWORD(DISPLAY,data_mask,LINE_SIZE,FALSE);
00000F56  2              COLUMN := 40;
00000F60  2              FMT_INTEGER(DISPLAY,STACK^[INDEX].DATAMASK,16,LINE_SIZE,FALSE);
00000F94  2              COLUMN := 55;
00000F9E  2              FMT_KEYWORD(DISPLAY,stat_mask,LINE_SIZE,FALSE);
00000FBC  2              COLUMN := 65;
00000FC6  2              FMT_INTEGER(DISPLAY,STACK^[INDEX].STATMASK,16,LINE_SIZE,FALSE);
00000FFA  2              OUTPUT_LINE(DISPLAY);
00001008  2              END;
0000100C  2          VALUE_OP : BEGIN
0000100C  2              COLUMN := 5;
00001016  2              FMT_KEYWORD(DISPLAY,val_value,LINE_SIZE,FALSE);
00001034  2              COLUMN := 15;
0000103E  2              FMT_INTEGER(DISPLAY,STACK^[INDEX].VAL_VALUE,10,LINE_SIZE,FALSE);
0000106E  2              COLUMN := 40;
00001078  2              FMT_KEYWORD(DISPLAY,rel_op,LINE_SIZE,FALSE);
00001096  2              COLUMN := 50;
000010A0  2              FMT_INTEGER(DISPLAY,STACK^[INDEX].REL_OP,2,LINE_SIZE,FALSE);
000010D4  2              OUTPUT_LINE(DISPLAY);
000010E2  2              END;
000010E6  2          OFFSET : BEGIN
000010E6  2              COLUMN := 5;
000010F0  2              FMT_KEYWORD(DISPLAY,offsets,LINE_SIZE,FALSE);
0000110E  2              COLUMN := 40;
00001118  2              FMT_KEYWORD(DISPLAY,sizes,LINE_SIZE,FALSE);
00001136  2              I := 0;
0000113A  2              WHILE (I < 9) AND (STACK^[INDEX].SIZES[I] <> -1) DO
00001178  2                  BEGIN
00001178  2                  COLUMN := 15;
00001182  2                  FMT_INTEGER(DISPLAY,STACK^[INDEX].OFFSETS[I],16,LINE_SIZE,FALSE);
000011BC  2                  COLUMN := 50;
000011C6  2                  FMT_INTEGER(DISPLAY,STACK^[INDEX].SIZES[I],16,LINE_SIZE,FALSE);
00001200  2                  OUTPUT_LINE(DISPLAY);
0000120E  2                  I := I + 1;
00001212  2                  END;
00001216  2              END;
0000121A  2          PARENTS : BEGIN
0000121A  2              COLUMN := 5;
00001224  2              FMT_KEYWORD(DISPLAY,proc_nums,LINE_SIZE,FALSE);
00001242  2              COLUMN := 40;
0000124C  2              FMT_KEYWORD(DISPLAY,stack_offs,LINE_SIZE,FALSE);
0000126A  2              I := 0;
0000126E  2              WHILE (I < 15) AND (STACK^[INDEX].PROC_NUMS[I] <> -1) DO
000012AA  2                  BEGIN
000012AA  2                  COLUMN := 15;
000012B4  2                  FMT_INTEGER(DISPLAY,INTEGER(STACK^[INDEX].PROC_NUMS[I]),10,LINE_SIZE,FALSE);
000012F2  2                  COLUMN := 50;
000012FC  2                  FMT_INTEGER(DISPLAY,INTEGER(STACK^[INDEX].STACK_OFFS[I]),16,LINE_SIZE,FALSE);
0000133A  2                  OUTPUT_LINE(DISPLAY);
00001348  2                  I := I + 1;
0000134C  2                  END;
00001350  2              END;
```

```
00001354  2          LINES : BEGIN
00001354  2               COLUMN := 5;
0000135E  2               FMT_KEYWORD(DISPLAY,address,LINE_SIZE,FALSE);
0000137C  2               I := 0;
00001380  2               WHILE (I < 19) AND (STACK^[INDEX].ADDRS[I] <> -1) DO
000013BE  2                    BEGIN
000013BE  2                    COLUMN := 15;
000013C8  2                    FMT_INTEGER(DISPLAY,INTEGER(STACK^[INDEX].ADDRS[I]),16,LINE_SIZE,FALSE);
00001402  2                    OUTPUT_LINE(DISPLAY);
00001410  2                    I := I + 1;
00001414  2                    END;
00001418  2               END;
0000141C  2          PROCS : BEGIN
0000141C  2               COLUMN := 5;
00001426  2               FMT_KEYWORD(DISPLAY,entry,LINE_SIZE,FALSE);
00001444  2               COLUMN := 40;
0000144E  2               FMT_KEYWORD(DISPLAY,exit,LINE_SIZE,FALSE);
0000146C  2               I := 0;
00001470  2               WHILE (I < 9) AND (STACK^[INDEX].ENTRYS[I] <> -1) DO
000014AE  2                    BEGIN
000014AE  2                    COLUMN := 15;
000014B8  2                    FMT_INTEGER(DISPLAY,INTEGER(STACK^[INDEX].ENTRYS[I]),16,LINE_SIZE,FALSE);
000014F2  2                    COLUMN := 55;
000014FC  2                    FMT_INTEGER(DISPLAY,INTEGER(STACK^[INDEX].EXITS[I]),16,LINE_SIZE,FALSE);
00001536  2                    OUTPUT_LINE(DISPLAY);
00001544  2                    I := I + 1;
00001548  2                    END;
0000154C  2               END;
00001550  2          OTHERWISE ; {no error trap}
00001550  2          END;
0000158A  2     ERASE_LINE(DISPLAY);
00001598  2     OUTPUT_LINE(DISPLAY);
000015A6  2     UNTIL STACK^[INDEX].OP_CODE = EOL;
000015BE  2 END;
000015DE  2 END;
00000000  1
00000000  1 PROCEDURE PICK_A_STACK(VAR DISPLAY : DISPLAY_TYPE; NAME : PTR; ELEMENT : CMD_RECORD_TYPE);
00000000  2 VAR
00000000  2 $EXTVAR+$
00000000  2 $FAR$
00000000  2     STARS : PTR;
00000000  2     command_stack : PTR;
00000000  2     spec_stack : PTR;
00000000  2 $BASE_PAGE$
00000000  2 $EXTVAR-$
000015D4  2 BEGIN
000015D4  2 CASE DEBUG.STACK OF
000015DE  2     All : BEGIN
000015DE  2          OUTPUT_LINE(DISPLAY);
000015EC  2          FMT_KEYWORD(DISPLAY,STARS,LINE_SIZE,FALSE);
0000160A  2          FMT_KEYWORD(DISPLAY,NAME,LINE_SIZE,TRUE);
00001628  2          FMT_KEYWORD(DISPLAY,command_stack,LINE_SIZE,TRUE);
00001648  2          FORMAT_CMD_STACK(DISPLAY,ELEMENT.CMD);
00001658  2          OUTPUT_LINE(DISPLAY);
00001666  2          FMT_KEYWORD(DISPLAY,STARS,LINE_SIZE,FALSE);
00001684  2          FMT_KEYWORD(DISPLAY,NAME,LINE_SIZE,TRUE);
000016A2  2          FMT_KEYWORD(DISPLAY,spec_stack,LINE_SIZE,TRUE);
000016C2  2          FORMAT_SPEC_STACK(DISPLAY,SPECABLE_TYPE_PTR(ELEMENT.SPEC));
000016D6  2          END;
000016DA  2     Command_stack : BEGIN
000016CA  2          OUTPUT_LINE(DISPLAY);
000016E8  2          FMT_KEYWORD(DISPLAY,STARS,LINE_SIZE,FALSE);
00001706  2          FMT_KEYWORD(DISPLAY,NAME,LINE_SIZE,TRUE);
00001724  2          FMT_KEYWORD(DISPLAY,command_stack,LINE_SIZE,TRUE);
00001744  2          FORMAT_CMD_STACK(DISPLAY,ELEMENT.CMD);
00001754  2          END;
00001758  2     Spec_stack : BEGIN
00001758  2          OUTPUT_LINE(DISPLAY);
00001766  2          FMT_KEYWORD(DISPLAY,STARS,LINE_SIZE,FALSE);
00001784  2          FMT_KEYWORD(DISPLAY,NAME,LINE_SIZE,TRUE);
000017A2  2          FMT_KEYWORD(DISPLAY,spec_stack,LINE_SIZE,TRUE);
000017C2  2          FORMAT_SPEC_STACK(DISPLAY,SPECABLE_TYPE_PTR(ELEMENT.SPEC));
000017D6  2          END;
000017DA  2     OTHERWISE ; {no error trap}
000017DA  2     END;
```

```
000017FE  2  END;
00000000  1
00000000  1  $GLOBPROC+$
00000000  1
00000000  1  PROCEDURE FORMAT_STACK(VAR DISPLAY : DISPLAY_TYPE);
00000000  2  VAR
00000000  2  $EXTVAR+$
00000000  2  $FAPS
00000000  2      code_rev : PTR;
00000000  2      suds_date : PTR;
00000000  2      execution : PTR;
00000000  2      measurement : PTR;
00000000  2      start_on : PTR;
00000000  2      stop_on : PTR;
00000000  2  $BASE_PAGE$
00000000  2  $EXTVAR-$
00001806  2  BEGIN
00001806  2  WITH DISPLAY DO BEGIN
0000180E  2  ERASE_LINE(DISPLAY);
0000181C  2  FMT_KEYWORD(DISPLAY,code_rev,LINE_SIZE,TRUE);
0000183C  2  FMT_INTEGER(DISPLAY,CODE_REV,16,LINE_SIZE,TRUE);
00001862  2  FMT_KEYWORD(DISPLAY,suds_date,LINE_SIZE,TRUE);
00001882  2  FMT_INTEGER(DISPLAY,SUDS_DATE,16,LINE_SIZE,FALSE);
000018A2  2  OUTPUT_LINE(DISPLAY);
000018B0  2  CASE DEBUG.COMMAND OF
000018BA  2      All : BEGIN
000018BA  2           PICK_A_STACK(DISPLAY,execution,MEAS_SETUP[EXECUTION]);
000018D4  2           PICK_A_STACK(DISPLAY,measurement,MEAS_SETUP[MEASUREMENT]);
000018EE  2           PICK_A_STACK(DISPLAY,start_on,MEAS_SETUP[START_ON]);
00001908  2           PICK_A_STACK(DISPLAY,stop_on,MEAS_SETUP[STOP_ON]);
00001922  2           END;
00001926  2      Execution : BEGIN
00001926  2           PICK_A_STACK(DISPLAY,execution,MEAS_SETUP[EXECUTION]);
00001940  2           END;
00001944  2      Measurement : BEGIN
00001944  2           PICK_A_STACK(DISPLAY,measurement,MEAS_SETUP[MEASUREMENT]);
0000195E  2           END;
00001962  2      Enable : BEGIN
00001962  2           PICK_A_STACK(DISPLAY,start_on,MEAS_SETUP[START_ON]);
0000197C  2           END;
00001980  2      Disable : BEGIN
00001980  2           PICK_A_STACK(DISPLAY,stop_on,MEAS_SETUP[STOP_ON]);
0000199A  2           END;
0000199E  2      OTHERWISE ; {no error trap}
0000199E  2      END;
000019C6  2  IF NOT COPY_FLAG THEN
000019D2  2      OUTPUT_SCREEN(DISPLAY);
000019E0  2  MAX_LINE := ROW - 1;
000019EE  2  END;
000019EE  2  END;
00000000  1  .
```

End of compilation, number of errors=    0

```
"68000"
-
KEY_ARRAY        MACRO &WORD
L_&WORD          DC.W EW&WORD-L_&WORD-2
                 ASCII "&WORD"
EW&WORD
                 MEND

KEY_WORD         MACRO &WORD
                 GLOBAL &WORD
&WORD            DC.L SK&WORD
SK&WORD          DC.W EK&WORD-SK&WORD-2
                 ASCII "&WORD"
EK&WORD
                 MEND

SYMBOL           MACRO &NAME,&SYMBOL
                 GLOBAL &NAME
&NAME            DC.L SS&NAME
SS&NAME          DC.W ES&NAME-SS&NAME-2
```

```
                              ASCII &SYMBOL
                 ES&NAME
                              MEND

000000                        KEY_WORD code_rev
00000E                        KEY_WORD suds_date

00001D                        KEY_WORD measurement
00002F                        KEY_WORD execution
00003F                        KEY_WORD start_on
00004E                        KEY_WORD stop_on
00005D                        KEY_WORD command_stack
00006F                        KEY_WORD spec_stack

000080                        KEY_WORD proc_num
00008E                        KEY_WORD file_num
00009C                        KEY_WORD flags
0000A7                        KEY_WORD status
0000B4                        KEY_WORD line_1
0000C0                        KEY_WORD line_2  ,
0000CC                        KEY_WORD proc_name
0000DB                        KEY_WORD file_name
0000EB                        KEY_WORD size
0000F6                        KEY_WORD en_offset
000105                        KEY_WORD ex_offset
000115                        KEY_WORD db_ptr
000122                        KEY_WORD db_length
000131                        KEY_WORD language
000140                        KEY_WORD adrs
00014A                        KEY_WORD adrs_mask
000159                        KEY_WORD data
000164                        KEY_WORD data_mask
000173                        KEY_WORD stat
00017E                        KEY_WORD stat_mask
00018D                        KEY_WORD val_value
00019D                        KEY_WORD rel_op
0001AA                        KEY_WORD offsets
0001B7                        KEY_WORD sizes
0001C3                        KEY_WORD proc_nums
0001D3                        KEY_WORD stack_offs

0001E4                        KEY_WORD pointer
0001F1                        KEY_WORD length
0001FE                        KEY_WORD value
000209                        KEY_WORD base
000214                        KEY_WORD mask
00021E                        KEY_WORD ident
000229                        KEY_WORD disc
000234                        KEY_WORD operand

                              GLOBAL CMD_SYMBOLS

000242 000002BA  CMD_SYMBOLS  DC.L L_tr_var
000246 000002C2               DC.L L_tr_asn
00024A 000002CA               DC.L L_tr_dat
00024E 000002B2               DC.L L_tr_mod
000252 000002DA               DC.L L_tr_sta
000256 000002E2               DC.L L_tr_xxx
00025A 000002EA               DC.L L_disp_var
00025E 000002F4               DC.L L_mod_var
000262 000002FE               DC.L L_ti_mod
000266 00000306               DC.L L_ti_sta
00026A 0000030E               DC.L L_ct_mod
00026E 00000316               DC.L L_ct_sta
000272 0000031E               DC.L L_brk_on
000276 00000326               DC.L L_cd_ena
00027A 0000032E               DC.L L_cd_dis
00027E 00000336               DC.L L_at_run
000282 0000033E               DC.L L_command
000286 00000348               DC.L L_var_op
00028A 00000350               DC.L L_proc_op
00028E 0000035A               DC.L L_line_op
000292 00000364               DC.L L_file_op
000296 0000036E               DC.L L_symbol
00029A 00000376               DC.L L_state_op
```

```
00029E 00000380                DC.L L_value_op ,
0002A2 0000038A                DC.L L_offset
0002A6 00000392                DC.L L_parents
0002AA 0000039C                DC.L L_lines
0002AE 000003A4                DC.L L_procs
0002B2 000003AC                DC.L L_followed_by
0002B6 000003BA                DC.L L_eol

0002BA                         KEY_ARRAY tr_var
0002C2                         KEY_ARRAY tr_asn
0002CA                         KEY_ARRAY tr_dat
0002D2                         KEY_ARRAY tr_mod
0002DA                         KEY_ARRAY tr_sta
0002E2                         KEY_ARRAY tr_xxx
0002EA                         KEY_ARRAY disp_var
0002F4                         KEY_ARRAY mod_var
0002FD                         KEY_ARRAY ti_mod
000305                         KEY_ARRAY ti_sta
00030E                         KEY_ARRAY ct_mod
000316                         KEY_ARRAY ct_sta
00031E                         KEY_ARRAY brk_on
000326                         KEY_ARRAY cd_ena
00032E                         KEY_ARRAY cd_dis
000336                         KEY_ARRAY at_run
00033E                         KEY_ARRAY command
000347                         KEY_ARRAY var_op
000350                         KEY_ARRAY proc_op
000359                         KEY_ARRAY line_op
000363                         KEY_ARRAY file_op
00036D                         KEY_ARRAY symbol
000376                         KEY_ARRAY state_op
000380                         KEY_ARRAY value_op
00038A                         KEY_ARRAY offset
000392                         KEY_ARRAY parents
00039B                         KEY_ARRAY lines
0003A3                         KEY_ARRAY procs
0003AB                         KEY_ARRAY followed_by
0003B9                         KEY_ARRAY eol

                               GLOBAL SPEC_SYMBOLS

0003C0 000003FC                DC.L L_vend
0003C4 00000402                DC.L L_end
0003C8 00000408  SPEC_SYMBOLS  DC.L L_ptr
0003CC 0000040E                DC.L L_index
0003D0 00000416                DC.L L_scalar
0003D4 0000041E                DC.L L_ident
0003D8 00000426                DC.L L_line
0003DC 0000042C                DC.L L_module
0003E0 0000036E                DC.L L_symbol
0003E4 00000434                DC.L L_value
0003E8 0000043C                DC.L L_dxval
0003EC 00000444                DC.L L_proc
0003F0 0000044A                DC.L L_file
0003F4 00000450                DC.L L_operand
0003F8 0000045A                DC.L L_address

0003FC                         KEY_ARRAY vend   ,
000402                         KEY_ARRAY end
000407                         KEY_ARRAY ptr
00040D                         KEY_ARRAY index
000415                         KEY_ARRAY scalar
00041E                         KEY_ARRAY ident
000425                         KEY_ARRAY line
00042C                         KEY_ARRAY module
                 *             KEY_ARRAY symbol            already got one
000434                         KEY_ARRAY value
00043B                         KEY_ARRAY dxval
000443                         KEY_ARRAY proc
00044A                         KEY_ARRAY file
000450                         KEY_ARRAY operand
000459                         KEY_ARRAY address
```

```
000363                     SYMBOL STARS,"***********"

                           END
        Errors=   0
```

```
FILE: DISPLAY:SODAMO     HP 64000 - Pascal    ^2^00 Compiler

00000000  1  "68000" PREPROCESS
00000000  1  $BASE_PAGES
00000000  1  $WIDTH 120$
00000000  1
00000000  1  PROGRAM DISPLAY_;
00000000  1
00000000  1  $EXTENSIONS ON$
00000000  1  $LIB_ABS_LONG$
00000000  1  $WARN OFF$
00000000  1
00000000  1  CONST
00000000  1      BLANK = 20H;
00000000  1
00000000  1  TYPE
00000000  1      INT = SIGNED_16;
00000000  1      PTR = ^ INTEGER;
00000000  1      WPTR = ^ INT;
00000000  1      BPTR = ^ BYTE;
00000000  1      VECTORO_7 = ARRAY[0..7] OF INT;
00000000  1      DOUBLE_WORD = RECORD
00000000  2                   MSW : INT;
00000000  2                   LSW : INT;
00000000  1                   END;
00000000  1      COMPLEX_TYPE = RECORD
00000000  2                   VALUE : DOUBLE_WORD;
00000000  2                   MASK : DOUBLE_WORD;
00000000  1                   END;
00000000  1  #INCLUDE ICMD_DATA:SODAMON
00000000  1  #INCLUDE ISPEC_DATA:SODAMON
00000000  1  #INCLUDE IDISPLAY:SODAMON
00000000  1
00000000  1  VAR
00000000  1  $EXTVAR+$
00000000  1      MEAS_SETUP : CMD_ARRAY;
00000000  1      VAR_STACK : SPECABLE_TYPE_PTR;
00000000  1      DEFAULT_FILE : VECTORO_7;
00000000  1      DEFAULT_DISC : INT;
00000000  1      DEFAULT_PROC : VECTORO_7;
00000000  1      MEASUREMENT_TYPE : INT;
00000000  1      FILE_DCB : INT;
00000000  1  $EXTVAR-$
00000000  1
00000000  1  $CALL_ABS_LONG ON$
00000000  1  PROCEDURE P_WRITE (VAR DCB : INT; VAR RBUFF : LINE_BUFFER;
00000000  2                     VAR FMGR_CODE : INT); EXTERNAL;
00000000  1  PROCEDURE P_FILE_ERR (VAR DCB : INT; FMGR_CODE : INT); EXTERNAL;
00000000  1  PROCEDURE BPC_WRITE(ADDR_68K : INTEGER; ADDR_BPC : INT; LENGTH : INT); EXTERNAL;
00000000  1  PROCEDURE OUTIT(L :  CHAR; V : INT; B : CHAR); EXTERNAL;
00000000  1  $CALL_PC_SHORT ON$
00000000  1  PROCEDURE FORMAT (SIGNED:BOOLEAN; SOURCE:PTR; SOURCESIZE:INT;
00000000  2                    DEST:PTR; VAR DESTSIZE:INT; BASE:INT; JUSTIFY:INT); EXTERNAL;
00000000  1  PROCEDURE INCREMENT_STACK(VAR STACK : SPECABLE_TYPE_PTR); EXTERNAL;
00000000  1  PROCEDURE SYSTEM_MESSAGE(MESS_NUM, MESS_CODE : INT; MESSAGE : MESSAGE_TYPES); EXTERNAL;
00000000  1
00000000  1  $GLOBPROC+$
00000000  1
00000000  1  PROCEDURE ERASE_LINE(VAR DISPLAY : DISPLAY_TYPE);
00000000  2  VAR
00000000  2      I : INT;
00000004  2  BEGIN
00000004  2  WITH DISPLAY DO BEGIN
0000000C  2  FOR I := 0 TO LINE_SIZE DO
00000010  2      LIME^[I] := BLANK;
00000032  2  COLUMN := 0;
0000003A  2  END;
```

```
00000038  2  END;
00000000  1
00000000  1  PROCEDURE OUTPUT_LINE(VAR DISPLAY : DISPLAY_TYPE);
00000000  2  VAR
00000000  2      FMGR_CODE : INT;
00000002  2      I : INT;
00000004  2      ENHANCED : BOOLEAN;
00000005  2      UNDERLINE : BOOLEAN;
00000006  2      ENHANCE_CHAR : BOOLEAN;
00000042  2  BEGIN
00000042  2  WITH DISPLAY DO BEGIN
0000004A  2  IF COPY_FLAG THEN
00000052  2      BEGIN
00000052  2      ENHANCED := FALSE;
00000056  2      UNDERLINE := FALSE;
0000005A  2      LINE^[-1] := 40;            {record length}
00000062  2      FOR I := 0 TO LINE_SIZE DO
00000066  2          BEGIN
00000066  2          ENHANCE_CHAR := FALSE;
0000006A  2          IF SHIFT(LINE^[I],-7) = 1 THEN
00000084  2              BEGIN
00000084  2              ENHANCE_CHAR := TRUE;
0000008A  2              IF LINE^[I] = BYTE(SOH) THEN      {end enhance}
0000009E  2                  UNDERLINE := FALSE
000000A6  2              ELSE
000000A6  2                  BEGIN
000000A6  2                  UNDERLINE := TRUE;
000000AC  2                  ENHANCED := TRUE;
000000B2  2                  END;
000000B2  2              LINE^[I] := 020H; {' '}
000000C4  2              END;
000000C4  2          IF (NOT ENHANCE_CHAR) AND UNDERLINE THEN
000000D4  2              UNDER^[I] := 2DH   {'-'}
000000EC  2          ELSE
000000EC  2              UNDER^[I] := 20H;  {' '}
00000100  2          END;
00000112  2      P_WRITE(FILE_DCB,LINE^,FMGR_CODE);
0000012E  2      IF FMGR_CODE <> 0 THEN
00000136  2          P_FILE_ERR(FILE_DCB,FMGR_CODE);
00000146  2      IF ENHANCED THEN
0000014E  2          BEGIN
0000014E  2          LINE^ := UNDER^;
00000160  2          OUTPUT_LINE(DISPLAY);
0000016C  2          END;
0000016C  2      END
00000170  2  ELSE
00000170  2      BEGIN
00000170  2      IF ROW >= HORIZONTAL THEN
00000180  2          BEGIN
00000180  2          IF ROW - HORIZONTAL < SCREEN_SIZE THEN
00000190  2              FOR I := 0 TO LINE_SIZE DO
00000194  2                  SCREEN^[ROW - HORIZONTAL + 1][I] := LINE^[I]
000001CC  2          END
000001D0  2      ELSE
000001D0  2          IF ROW <= 0 THEN
000001DC  2              FOR I := 0 TO LINE_SIZE DO
000001E0  2                  SCREEN^[ROW][I] := LINE^[I];
00000212  2      END;
00000212  2  ROW := ROW + 1;
00000220  2  ERASE_LINE(DISPLAY);
0000022C  2  END;
0000022C  2  END;
00000000  1
00000000  1  PROCEDURE OUTPUT_SCREEN(VAR DISPLAY : DISPLAY_TYPE);
00000000  2  VAR
00000000  2      I : INT;
00000002  2      J : INT;
00000234  2  BEGIN
00000234  2  IF DISPLAY.ROW - DISPLAY.HORIZONTAL < SCREEN_SIZE THEN
00000248  2      FOR I := DISPLAY.ROW - DISPLAY.HORIZONTAL + 1 TO SCREEN_SIZE DO
00000260  2          FOR J := 0 TO LINE_SIZE DO
00000264  2              DISPLAY.SCREEN^[I][J] := 20H;
000002A2  2  BPC_WRITE(INTEGER(DISPLAY.SCREEN),SCREEN_START,SCREEN_LENGTH);
000002BA  2  END;
00000000  1
```

```
00000000  1  PROCEDURE FMT_INTEGER(VAR DISPLAY : DISPLAY_TYPE; SOURCE : INTEGER;
00000000  2                       BASE : INT; LAST_COL : INT; SPACE : BOOLEAN);
00000000  2  VAR
00000000  2      LOCAL_DEST : ARRAY[0..32] OF BYTE;
00000022  2      I : INT;
00000024  2      NEGATIVE : BOOLEAN;
00000025  2      OVERFLOW : BOOLEAN;
00000026  2      SIGNED : BOOLEAN;
00000027  2      LENGTH : INT;
000002C2  2  BEGIN
000002C2  2  WITH DISPLAY DO BEGIN
000002CA  2  CASE BASE OF
000002D4  2      2 :  BEGIN
000002D4  2           LENGTH := 33;
000002DA  2           SIGNED := FALSE;
000002DE  2           END;
000002E2  2      8 :  BEGIN
000002E2  2           LENGTH := 16;
000002E8  2           SIGNED := FALSE;
000002EC  2           END;
000002F0  2      10 : BEGIN
000002F0  2           LENGTH := 12;
000002F6  2           SIGNED := TRUE;
000002FC  2           END;
00000300  2      16 : BEGIN
00000300  2           LENGTH := 9;
00000306  2           SIGNED := FALSE;
0000030A  2           END;
0000030E  2      OTHERWISE LENGTH := 9;
00000314  2      END;
00000352  2  FORMAT(SIGNED,ADDR(SOURCE),4,ADDR(LOCAL_DEST),LENGTH,BASE,1);
0000037C  2  OVERFLOW := FALSE;
00000380  2  IF COLUMN + LENGTH - 1 > LAST_COL THEN
00000396  2      BEGIN
00000396  2      LENGTH := LAST_COL - COLUMN;
000003A2  2      OVERFLOW := TRUE;
000003A8  2      END;
000003A8  2  FOR I := 0 TO LENGTH - 1 DO
000003BE  2      BEGIN
000003BE  2      LINE^[COLUMN] := LOCAL_DEST[I];
000003D8  2      COLUMN := COLUMN + 1;
000003E6  2      END;
000003F8  2  IF OVERFLOW THEN
00000400  2      BEGIN
00000400  2      LINE^[LAST_COL] := 02AH;      ('*')
00000412  2      COLUMN := LAST_COL + 1;
00000420  2      END
00000424  2  ELSE IF SPACE THEN
0000042C  2      BEGIN
0000042C  2  (   LINE^[COLUMN] := BLANK;     )
0000042C  2      COLUMN := COLUMN + 1;
0000043A  2      END;
0000043A  2  END;
0000043A  2  END;
00000000  1
00000000  1  PROCEDURE FMT_KEYWORD(VAR DISPLAY : DISPLAY_TYPE;
00000000  2                      WORD_PTR : WPTR; LAST_COL : INT; SPACE : BOOLEAN);
00000000  2  VAR
00000000  2      I : INT;
00000002  2      LENGTH : INT;
00000004  2      BYTE_PTR : BPTR;
00000008  2      OVERFLOW : BOOLEAN;
00000442  2  BEGIN
00000442  2  WITH DISPLAY DO BEGIN
0000044A  2  OVERFLOW := FALSE;
0000044F  2  LENGTH := WORD_PTR^;
00000456  2  IF COLUMN + LENGTH - 1 > LAST_COL THEN
00000468  2      BEGIN
00000468  2      LENGTH := LAST_COL - COLUMN;
00000474  2      OVERFLOW := TRUE;
0000047A  2      END;
0000047A  2  BYTE_PTR := BPTR(INTEGER(WORD_PTR) + 2);
00000484  2  FOR I := 1 TO LENGTH DO
```

```
0000049A  2      BEGIN
0000049A  2      LINE^[COLUMN] := BYTE_PTR^;
000004AE  2      COLUMN := COLUMN + 1;
000004BC  2      BYTE_PTR := BPTR(INTEGER(BYTE_PTR) + 1);
000004C6  2      END;
000004D8  2  IF OVERFLOW THEN
000004E0  2      BEGIN
000004E0  2      LINE^[LAST_COL] := 02AH;      {'*'}
000004F2  2      COLUMN := LAST_COL + 1;
00000500  2      END
00000504  2  ELSE IF SPACE THEN
0000050C  2      BEGIN
0000050C  2  {   LINE^[COLUMN] := BLANK;     }
0000050C  2      COLUMN := COLUMN + 1;
0000051A  2      END;
0000051A  2  END;
0000051A  2  END;
00000000  1
00000000  1  PROCEDURE FMT_IDENT(VAR DISPLAY : DISPLAY_TYPE;
00000000  2                       VAR IDENT : VECTOR0_7; LAST_COL : INT; SPACE : BOOLEAN);
00000000  2  VAR
00000000  2      I : INT;
00000002  2      LENGTH : INT;
00000004  2      BYTE_PTR : BPTR;
00000006  2      OVERFLOW : BOOLEAN;
00000522  2  BEGIN
00000522  2  WITH DISPLAY DO BEGIN
0000052A  2  OVERFLOW := FALSE;
0000052E  2  LENGTH := SHIFT(SHIFT(IDENT[0],-13),+1);
00000540  2  IF COLUMN + LENGTH - 1 > LAST_COL THEN
00000550  2      BEGIN
00000550  2      LENGTH := LAST_COL - COLUMN;
0000055C  2      OVERFLOW := TRUE;
00000562  2      END;
00000562  2  BYTE_PTR := BPTR(INTEGER(ADDR(IDENT)) + 1);
0000056E  2  FOR I := 0 TO LENGTH DO
00000582  2      BEGIN
00000582  2      LINE^[COLUMN] := BYTE_PTR^;
00000596  2      BYTE_PTR := BPTR(INTEGER(BYTE_PTR) + 1);
000005A0  2      COLUMN := COLUMN + 1;
000005AE  2      END;
000005C0  2  IF LINE^[COLUMN - 1] = BLANK THEN
000005DA  2      COLUMN := COLUMN - 1;
000005E4  2  IF OVERFLOW THEN
000005EC  2      BEGIN
000005EC  2      LINE^[LAST_COL] := 02AH;      {'*'}
000005FE  2      COLUMN := LAST_COL + 1;
0000060C  2      END
00000610  2  ELSE IF SPACE THEN
00000618  2      BEGIN
00000618  2  {   LINE^[COLUMN] := BLANK;     }
00000618  2      COLUMN := COLUMN + 1;
00000626  2      END;
00000626  2  END;
00000626  2  END;
00000000  1
00000000  1  PROCEDURE FMT_FILE(VAR DISPLAY : DISPLAY_TYPE;
00000000  2                    VAR NAME : VECTOR0_7; DISC : INT;
00000000  2                    LAST_COL : INT; SPACE : BOOLEAN);
00000000  2  VAR
00000000  2  $EXTVAR+$
00000000  2  $FAR$
00000000  2      COLON : PTR;
00000000  2  $BASE_PAGE$
00000000  2  $EXTVAR-$
00000000  2      I : INT;
00000002  2      NAME_LENGTH : INT;
00000004  2      USER_LENGTH : INT;
00000006  2      BYTE_PTR : BPTR;
0000000A  2      OVERFLOW : BOOLEAN;
0000062E  2  BEGIN
0000062E  2  WITH DISPLAY DO BEGIN
00000636  2  OVERFLOW := FALSE;
0000063A  2  NAME_LENGTH := SHIFT(SHIFT(NAME[0],-13),+1) + 1;
0000064E  2  USER_LENGTH := SHIFT(SHIFT(SHIFT(NAME[0],+3),-14),+1);
```

```
0000065E  2  BYTE_PTR := BPTR(INTEGER(ADDR(NAME)) + 1);
0000066A  2  IF COLUMN + NAME_LENGTH - 1 > LAST_COL THEN
0000067A  2      BEGIN
0000067A  2      NAME_LENGTH := LAST_COL - COLUMN;
00000686  2      OVERFLOW := TRUE;
0000068C  2      END;
0000068C  2  FOR I := 1 TO NAME_LENGTH DO
000006A2  2      BEGIN
000006A2  2      LINE^[COLUMN] := BYTE_PTR^;
000006B6  2      BYTE_PTR := BPTR(INTEGER(BYTE_PTR) + 1);
000006C0  2      COLUMN := COLUMN + 1;
000006CE  2      END;
000006E0  2  IF LINE^[COLUMN - 1] = BLANK THEN
000006FA  2      COLUMN := COLUMN - 1;
00000704  2  FMT_KEYWORD(DISPLAY,COLON,LAST_COL,FALSE);
00000720  2  IF COLUMN + USER_LENGTH - 1 > LAST_COL THEN
00000736  2      BEGIN
00000736  2      USER_LENGTH := LAST_COL - COLUMN;
00000742  2      OVERFLOW := TRUE;
00000748  2      END;
00000748  2  FOR I := 1 TO USER_LENGTH DO
0000075E  2      BEGIN
0000075E  2      LINE^[COLUMN] := BYTE_PTR^;
00000772  2      BYTE_PTR := BPTR(INTEGER(BYTE_PTR) + 1);
0000077C  2      COLUMN := COLUMN + 1;
0000078A  2      END;
0000079C  2  IF LINE^[COLUMN - 1] = BLANK THEN
000007B6  2      COLUMN := COLUMN - 1;
000007C0  2  IF COLUMN + 2 - 1 > LAST_COL THEN
000007D4  2      BEGIN
000007D4  2      OVERFLOW := TRUE;
000007DA  2      END;
000007DA  2  IF (DISC <> -1) AND (DISC <> 0) AND (NOT OVERFLOW) THEN
00000800  2      BEGIN
00000800  2      FMT_KEYWORD(DISPLAY,COLON,LAST_COL,FALSE);
0000081C  2      LINE^[COLUMN] := 030H + DISC;              ('0' + DISC)
00000834  2      COLUMN := COLUMN + 1;
00000842  2      END;
00000842  2  IF OVERFLOW THEN
0000084A  2      BEGIN
0000084A  2      LINE^[LAST_COL] := 02AH;      ('*')
0000085C  2      COLUMN := LAST_COL + 1;
0000086A  2      END
0000086E  2  ELSE IF SPACE THEN
00000876  2      BEGIN
00000876  2  (   LINE^[COLUMN] := BLANK;     )
00000876  2      COLUMN := COLUMN + 1;
00000884  2      END;
00000884  2  END;
00000884  2  END;
00000000  1
00000000  1  $GLOBPROC+$
00000000  1
00000000  1  PROCEDURE SHOW_SETUP(VAR DISPLAY : DISPLAY_TYPE);
00000000  2  VAR
00000000  2      STACK_PTR : SPECABLE_TYPE_PTR;
00000004  2
00000004  2      VAR_COL : INT;
00000006  2      MOD_COL : INT;
00000008  2      STATUS_COL : INT;
0000000A  2      PROC_COL : INT;
0000000C  2      FILE_COL : INT;
0000000E  2      LABEL_MOD : BOOLEAN;
00000000  2
00000000  2  PROCEDURE FMT_SPEC(VAR DISPLAY : DISPLAY_TYPE; TERMINATION : INT);
00000000  3  VAR
00000000  3  $EXTVAR+$
00000000  3  $FARS
00000000  3      read : PTR;
00000000  3      write : PTR;
00000000  3      read_write : PTR;
00000000  3      last_access : PTR;
00000000  3      entry_exit : PTR;
00000000  3      entry : PTR;
```

```
00000000 3      exit : PTR;
00000000 3      next_pc : PTR;
00000000 3      transfer_address : PTR;
00000000 3      module : PTR;
00000000 3      proc : PTR;
00000000 3      file : PTR;
00000000 3      line : PTR;
00000000 3      to : PTR;
00000000 3      address : PTR;
00000000 3      any_state : PTR;
00000000 3      all : PTR;
00000000 3      followed_by : PTR;
00000000 3      or : PTR;
00000000 3      LEFT_BRACKET : PTR;
00000000 3      RIGHT_BRACKET : PTR;
00000000 3      PERIOD : PTR;
00000000 3      UP_ARROW : PTR;
00000000 3      RIGHT_ARROW : PTR;
00000000 3      STAR : PTR;
00000000 3      EQUAL : PTR;
00000000 3  {   NOT_EQUAL : PTR;            }
00000000 3  {   GREATER_THAN : PTR;         }
00000000 3  {   LESS_THAN : PTR;            }
00000000 3  {   GREATER_EQUAL : PTR;        }
00000000 3  {   LESS_EQUAL : PTR;           }
00000000 3  $BASE_PAGES
00000000 3  $EXTVAR-$
00000000 3      ON_VAR : BOOLEAN;
00000001 3      LINE_RANGE : BOOLEAN;
00000002 3      SKIP_THE_DOT : BOOLEAN;
0000088C 3  BEGIN
0000088C 3  WITH DISPLAY DO BEGIN
00000894 3  ON_VAR := FALSE;
00000898 3  LINE_RANGE := FALSE;
0000089C 3  SKIP_THE_DOT := FALSE;
000008A0 3  WHILE STACK_PTR^.OP_CODE <> TERMINATION DO
000008B2 3      BEGIN
000008B2 3      CASE STACK_PTR^.OP_CODE OF
000008BA 3          SPEC_VEND : BEGIN           {end of variable sub-stack}
000008BA 3              ON_VAR := FALSE;
000008BE 3              COLUMN := COLUMN + 1;
000008CC 3              END;
000008D0 3          SPEC_END : BEGIN            {end of spec stack}
000008D0 3              END;
000008D4 3          SPEC_PTR : BEGIN            {*,->,^}
000008D4 3              CASE STACK_PTR^.OPERAND OF
000008E6 3                  SPEC_OP_UP : FMT_KEYWORD(DISPLAY,UP_ARROW,VAR_COL + 26,FALSE);
00000910 3                  SPEC_OP_PO : BEGIN
00000910 3                      FMT_KEYWORD(DISPLAY,RIGHT_ARROW,VAR_COL + 26,FALSE);
00000936 3                      SKIP_THE_DOT := TRUE;
0000093C 3                      END;
00000940 3                  SPEC_OP_ST : ; {don't display this star}
00000944 3                  SPEC_OP_FS : BEGIN
00000944 3                      OUTPUT_LINE(DISPLAY);
00000950 3                      COLUMN := VAR_COL;
0000095E 3                      FMT_KEYWORD(DISPLAY,STAR,VAR_COL + 26,FALSE);
00000984 3                      ON_VAR := TRUE;
0000098A 3                      SKIP_THE_DOT := TRUE;
00000990 3                      END;
00000994 3                  OTHERWISE ; {no error trap}
00000994 3                  END;
000009C0 3              END;
000009C4 3          SPEC_INDEX : BEGIN          {numeric index}
000009C4 3              FMT_KEYWORD(DISPLAY,LEFT_BRACKET,VAR_COL + 26,FALSE);
000009EA 3              FMT_INTEGER(DISPLAY,STACK_PTR^.VALUE,10,VAR_COL + 26,FALSE);
00000A16 3              FMT_KEYWORD(DISPLAY,RIGHT_BRACKET,VAR_COL + 26,FALSE);
00000A3C 3              END;
00000A40 3          SPEC_SCALAR : BEGIN         {scalar index}
00000A40 3              FMT_KEYWORD(DISPLAY,LEFT_BRACKET,VAR_COL + 26,FALSE);
00000A66 3              FMT_IDENT(DISPLAY,STACK_PTR^.IDENT,VAR_COL + 26,FALSE);
00000A8E 3              FMT_KEYWORD(DISPLAY,RIGHT_BRACKET,VAR_COL + 26,FALSE);
00000AB4 3              END;
00000AB8 3          SPEC_IDENT : BEGIN          {identifier}
00000AB8 3              IF NOT ON_VAR THEN
```

```
00000AC0  3                 BEGIN
00000AC0  3                 OUTPUT_LINE(DISPLAY);
00000ACC  3                 COLUMN := VAR_COL;
00000ADA  3                 END
00000ADE  3             ELSE
00000ADE  3                 IF NOT SKIP_THE_DOT THEN
00000AE6  3                     FMT_KEYWORD(DISPLAY,PERIOD,VAR_COL + 26,FALSE);
00000B0C  3             FMT_IDENT(DISPLAY,STACK_PTR^.IDENT,VAR_COL + 26,FALSE);
00000B34  3             ON_VAR := TRUE;
00000B3A  3             SKIP_THE_DOT := FALSE;
00000B3E  3             END;
00000B42  3         SPEC_LINE : BEGIN           {line}
00000B42  3             IF NOT LINE_RANGE THEN
00000B4A  3                 BEGIN
00000B4A  3                 OUTPUT_LINE(DISPLAY);
00000B56  3                 COLUMN := MOD_COL;
00000B64  3                 IF LABEL_MOD THEN
00000B70  3                     FMT_KEYWORD(DISPLAY,line,LINE_SIZE,TRUE);
00000B8E  3                 FMT_INTEGER(DISPLAY,STACK_PTR^.VALUE,10,LINE_SIZE,TRUE);
00000BB6  3                 LINE_RANGE := TRUE;
00000BBC  3                 END
00000BC0  3             ELSE BEGIN
00000BC0  3                 COLUMN := COLUMN + 1;
00000BCE  3                 FMT_KEYWORD(DISPLAY,to,LINE_SIZE,TRUE);
00000BEC  3                 FMT_INTEGER(DISPLAY,STACK_PTR^.VALUE,10,LINE_SIZE,TRUE);
00000C14  3                 END;
00000C14  3             END;
00000C18  3         SPEC_SYMBOL,                {symbol}
00000C18  3         SPEC_MODULE : BEGIN         {module}
00000C18  3             OUTPUT_LINE(DISPLAY);
00000C24  3             COLUMN := MOD_COL;
00000C32  3             IF LABEL_MOD THEN
00000C3E  3                 FMT_KEYWORD(DISPLAY,module,LINE_SIZE,TRUE);
00000C5C  3             FMT_IDENT(DISPLAY,STACK_PTR^.IDENT,LINE_SIZE,TRUE);
00000C80  3             END;
00000C84  3         SPEC_VALUE : BEGIN          {value}
00000C84  3             FMT_INTEGER(DISPLAY,STACK_PTR^.VALUE,16,LINE_SIZE,FALSE);
00000CAA  3             END;
00000CAE  3         SPEC_DKVAL : BEGIN          {dont_care value}
00000CAE  3             END;
00000CB2  3         SPEC_PROC : BEGIN           {path_proc_name}
00000CB2  3             IF PROC_COL = 0 THEN
00000CBE  3                 FMT_KEYWORD(DISPLAY,proc,LINE_SIZE,TRUE)
00000CE0  3             ELSE
00000CE0  3                 COLUMN := PROC_COL;
00000CEE  3             FMT_IDENT(DISPLAY,STACK_PTR^.IDENT,LINE_SIZE,TRUE);
00000D12  3             END;
00000D16  3         SPEC_FILE : BEGIN           {path_file_name}
00000D16  3             IF FILE_COL = 0 THEN
00000D22  3                 FMT_KEYWORD(DISPLAY,file,LINE_SIZE,TRUE)
00000D44  3             ELSE
00000D44  3                 COLUMN := FILE_COL;
00000D52  3             FMT_FILE(DISPLAY,STACK_PTR^.IDENT,STACK_PTR^.DISC,LINE_SIZE,FALSE);
00000D78  3             LINE_RANGE := FALSE;
00000D7C  3             END;
00000D80  3         SPEC_OPERAND : BEGIN        {operand}
00000D80  3             CASE STACK_PTR^.OPERAND OF
00000D92  3                 SPEC_OP_RE : BEGIN          {read}
00000D92  3                     IF STATUS_COL = 0 THEN
00000D9E  3                         COLUMN := COLUMN + 1
00000DB0  3                     ELSE
00000DB0  3                         COLUMN := STATUS_COL;
00000DBE  3                     FMT_KEYWORD(DISPLAY,read,LINE_SIZE,FALSE);
00000DDA  3                     END;
00000DDE  3                 SPEC_OP_WR : BEGIN          {write}
00000DDE  3                     IF STATUS_COL = 0 THEN
00000DEA  3                         COLUMN := COLUMN + 1
00000DFC  3                     ELSE
00000DFC  3                         COLUMN := STATUS_COL;
00000E0A  3                     FMT_KEYWORD(DISPLAY,write,LINE_SIZE,FALSE);
00000E26  3                     END;
00000E2A  3                 SPEC_OP_RW : BEGIN          {read_write}
00000E2A  3                     IF STATUS_COL = 0 THEN
00000E36  3                         COLUMN := COLUMN + 1
```

```
00000E48  3                ELSE
00000E48  3                    COLUMN := STATUS_COL;
00000E56  3                FMT_KEYWORD(DISPLAY,read_write,LINE_SIZE,FALSE);
00000E72  3                END;
00000E76  3            SPEC_OP_EE : BEGIN          {entry_exit}
00000E76  3                IF STATUS_COL = 0 THEN
00000E82  3                    COLUMN := COLUMN + 1
00000E94  3                ELSE
00000E94  3                    COLUMN := STATUS_COL;
00000EA2  3                FMT_KEYWORD(DISPLAY,entry_exit,LINE_SIZE,FALSE);
00000EBE  3                END;
00000EC2  3            SPEC_OP_EN : BEGIN          {entry}
00000EC2  3                IF STATUS_COL = 0 THEN
00000ECE  3                    COLUMN := COLUMN + 1
00000EE0  3                ELSE
00000EE0  3                    COLUMN := STATUS_COL;
00000EEE  3                FMT_KEYWORD(DISPLAY,entry,LINE_SIZE,FALSE);
00000F0A  3                END;
00000F0E  3            SPEC_OP_EX : BEGIN          {exit}
00000F0E  3                IF STATUS_COL = 0 THEN
00000F1A  3                    COLUMN := COLUMN + 1
00000F2C  3                ELSE
00000F2C  3                    COLUMN := STATUS_COL;
00000F3A  3                FMT_KEYWORD(DISPLAY,exit,LINE_SIZE,FALSE);
00000F56  3                END;
00000F5A  3            SPEC_OP_PC : BEGIN          {program_counter}
00000F5A  3                OUTPUT_LINE(DISPLAY);
00000F66  3                COLUMN := MOD_COL;
00000F74  3                FMT_KEYWORD(DISPLAY,next_pc,LINE_SIZE,FALSE);
00000F90  3                END;
00000F94  3            SPEC_OP_TA : BEGIN          {transfer_address}
00000F94  3                OUTPUT_LINE(DISPLAY);
00000FA0  3                COLUMN := MOD_COL;
00000FAE  3                FMT_KEYWORD(DISPLAY,transfer_address,LINE_SIZE,FALSE);
00000FCA  3                END;
00000FCE  3            SPEC_OP_EQ : BEGIN          {=}
00000FCE  3                COLUMN := COLUMN + 1;
00000FDC  3                FMT_KEYWORD(DISPLAY,EQUAL,LINE_SIZE,TRUE);
00000FFA  3                END;
00000FFE  3            SPEC_OP_NE : BEGIN          {<>}
00000FFE  3              { COLUMN := COLUMN + 1;   }
00000FFE  3              { FMT_KEYWORD(DISPLAY,NOT_EQUAL,LINE_SIZE,TRUE);          }
00000FFE  3                END;
00001002  3            SPEC_OP_LT : BEGIN          {<}
00001002  3              { COLUMN := COLUMN + 1;   }
00001002  3              { FMT_KEYWORD(DISPLAY,LESS_THAN,LINE_SIZE,TRUE);          }
00001002  3                END;
00001006  3            SPEC_OP_GT : BEGIN          {>}
00001006  3              { COLUMN := COLUMN + 1;   }
00001006  3              { FMT_KEYWORD(DISPLAY,GREATER_THAN,LINE_SIZE,TRUE);       }
00001006  3                END;
0000100A  3            SPEC_OP_LE : BEGIN          {<=}
0000100A  3              { COLUMN := COLUMN + 1;   }
0000100A  3              { FMT_KEYWORD(DISPLAY,LESS_EQUAL,LINE_SIZE,TRUE);         }
0000100A  3                END;
0000100E  3            SPEC_OP_GE : BEGIN          {>=}
0000100E  3              { COLUMN := COLUMN + 1;   }
0000100E  3              { FMT_KEYWORD(DISPLAY,GREATER_EQUAL,LINE_SIZE,TRUE);      }
0000100E  3                END;
00001012  3            SPEC_OP_ANY : BEGIN         {any_state}
00001012  3                OUTPUT_LINE(DISPLAY);
0000101E  3                COLUMN := 5;
00001028  3                FMT_KEYWORD(DISPLAY,any_state,LINE_SIZE,TRUE);
00001046  3                END;
0000104A  3            SPEC_OP_ALL : BEGIN         {all}
0000104A  3                OUTPUT_LINE(DISPLAY);
00001056  3                COLUMN := 5;
00001060  3                FMT_KEYWORD(DISPLAY,all,LINE_SIZE,TRUE);
0000107E  3                END;
00001082  3            SPEC_OP_BY : BEGIN          {followed_by}
00001082  3                OUTPUT_LINE(DISPLAY);
0000108E  3                COLUMN := 10;
00001098  3                FMT_KEYWORD(DISPLAY,followed_by,LINE_SIZE,TRUE);
000010B6  3                END;
```

```
000010BA  3                    SPEC_OP_OR : BEGIN          {or}
000010BA  3                         IF LABEL_MOD THEN
000010C6  3                              BEGIN
000010C6  3                              COLUMN := COLUMN + 1;
000010D4  3                              FMT_KEYWORD(DISPLAY,or,LINE_SIZE,FALSE);
000010F0  3                              END;
000010F0  3                         END;
000010F4  3                    SPEC_OP_DP : BEGIN          {default path used}
000010F4  3                         END;
000010F8  3                    OTHERWISE SYSTEM_MESSAGE(711,INT(STACK_PTR^.OPERAND),Error);
00001112  3                    END;
00001170  3               END;
00001174  3          SPEC_ADDRESS : BEGIN       {address}
00001174  3               OUTPUT_LINE(DISPLAY);
00001180  3               COLUMN := MOD_COL;
0000118E  3               FMT_KEYWORD(DISPLAY,address,LINE_SIZE,TRUE);
000011AC  3               FMT_INTEGER(DISPLAY,STACK_PTR^.VALUE,16,LINE_SIZE,FALSE);
000011D2  3               END;
000011D6  3          OTHERWISE SYSTEM_MESSAGE(712,INT(STACK_PTR^.OP_CODE),Error);
000011EE  3          END;
0000122C  3     INCREMENT_STACK(STACK_PTR);
0000123A  3     END;
0000123E  3  END;
0000123E  3  END;
00000000  2
00000000  2  {***************************************************************************}
00000000  2  {*                trace variables                                          *}
00000000  2  {***************************************************************************}
00000000  2  PROCEDURE FORMAT_TRACE_VARIABLES;
00000000  3  VAR
00000000  3  $EXTVAR+$
00000000  3  $FARS
00000000  3       TITLE_VAR : PTR;
00000000  3       TRACE : PTR;
00000000  3       VARIABLES : PTR;
00000000  3       read : PTR;
00000000  3       write : PTR;
00000000  3       read_write : PTR;
00000000  3       last_access : PTR;
00000000  3  $BASE_PAGES
00000000  3  $EXTVAR-$
00001246  3  BEGIN
00001246  3  FMT_KEYWORD(DISPLAY,TRACE,LINE_SIZE,TRUE);
00001268  3  FMT_KEYWORD(DISPLAY,VARIABLES,LINE_SIZE,TRUE);
0000128A  3  IF STACK_PTR^.OP_CODE = SPEC_OPERAND THEN
0000129C  3       BEGIN
0000129C  3       FMT_KEYWORD(DISPLAY,last_access,LINE_SIZE,FALSE);
000012B8  3       INCREMENT_STACK(STACK_PTR);
000012C6  3       END;
000012C6  3  OUTPUT_LINE(DISPLAY);
000012D6  3  OUTPUT_LINE(DISPLAY);
000012E6  3  FMT_KEYWORD(DISPLAY,TITLE_VAR,LINE_SIZE,FALSE);
00001306  3  VAR_COL := 5;
00001310  3  STATUS_COL := 68;
00001316  3  PROC_COL := 33;
0000131C  3  FILE_COL := 49;
00001322  3  FMT_SPEC(DISPLAY,SPEC_END);
0000133A  3  OUTPUT_LINE(DISPLAY);
0000134A  3  END;
00000000  2
00000000  2  {***************************************************************************}
00000000  2  {*                trace statements                                         *}
00000000  2  {***************************************************************************}
00000000  2  PROCEDURE FORMAT_TRACE_STATEMENTS;
00000000  3  VAR
00000000  3  $EXTVAR+$
00000000  3  $FARS
00000000  3       TITLE_STA : PTR;
00000000  3       TRACE : PTR;
00000000  3       STATEMENTS : PTR;
00000000  3       dont_care : PTR;
00000000  3  $BASE_PAGES
00000000  3  $EXTVAR-$
00001352  3  BEGIN
```

```
00001352  3  FMT_KEYWORD(DISPLAY,TRACE,LINE_SIZE,TRUE);
00001374  3  FMT_KEYWORD(DISPLAY,STATEMENTS,LINE_SIZE,FALSE);
00001394  3  OUTPUT_LINE(DISPLAY);
000013A4  3  MOD_COL  := 5;
000013AE  3  FILE_COL := 27;
000013B4  3  LABEL_MOD := FALSE;
000013B8  3  IF STACK_PTR^.OP_CODE <> SPEC_END THEN
000013C6  3     BEGIN
000013C6  3     OUTPUT_LINE(DISPLAY);
000013D2  3     FMT_KEYWORD(DISPLAY,TITLE_STA,LINE_SIZE,FALSE);
000013F2  3     FMT_SPEC(DISPLAY,SPEC_END);
0000140E  3     END
00001412  3  ELSE BEGIN
00001412  3     OUTPUT_LINE(DISPLAY);
00001422  3     DISPLAY.COLUMN := 5;
00001430  3     FMT_KEYWORD(DISPLAY,dont_care,LINE_SIZE,FALSE);
00001450  3     END;
00001450  3  OUTPUT_LINE(DISPLAY);
00001460  3  END;
00000000  2
00000000  2  {***************************************************************************}
00000000  2  {*                  trace modules                                          *}
00000000  2  {***************************************************************************}
00000000  2  PROCEDURE FORMAT_TRACE_MODULES;
00000000  3  VAR
00000000  3  $EXTVAR+$
00000000  3  $FARS
00000000  3     TITLE_MOD : PTR;
00000000  3     TRACE : PTR;
00000000  3     MODULES : PTR;
00000000  3  $BASE_PAGES
00000000  3  $EXTVAR-$
00001468  3  BEGIN
00001468  3  FMT_KEYWORD(DISPLAY,TRACE,LINE_SIZE,TRUE);
0000148A  3  FMT_KEYWORD(DISPLAY,MODULES,LINE_SIZE,FALSE);
000014AA  3  OUTPUT_LINE(DISPLAY);
000014BA  3  OUTPUT_LINE(DISPLAY);
000014CA  3  FMT_KEYWORD(DISPLAY,TITLE_MOD,LINE_SIZE,FALSE);
000014EA  3  MOD_COL  := 5;
000014F4  3  FILE_COL := 21;
000014FA  3  LABEL_MOD := FALSE;
000014FE  3  FMT_SPEC(DISPLAY,SPEC_END);
00001516  3  OUTPUT_LINE(DISPLAY);
00001526  3  END;
00000000  2
00000000  2  {***************************************************************************}
00000000  2  {*                  trace data_flow                                        *}
00000000  2  {***************************************************************************}
00000000  2  PROCEDURE FORMAT_TRACE_DATA_FLOW;
00000000  3  VAR
00000000  3  $EXTVAR+$
00000000  3  $FARS
00000000  3     TITLE_DAT : PTR;
00000000  3     TRACE : PTR;
00000000  3     DATA_FLOW : PTR;
00000000  3  $BASE_PAGES
00000000  3  $EXTVAR-$
0000152E  3  BEGIN
0000152E  3  FMT_KEYWORD(DISPLAY,TRACE,LINE_SIZE,TRUE);
00001550  3  FMT_KEYWORD(DISPLAY,DATA_FLOW,LINE_SIZE,TRUE);
00001572  3  OUTPUT_LINE(DISPLAY);
00001582  3  OUTPUT_LINE(DISPLAY);
00001592  3  FMT_KEYWORD(DISPLAY,TITLE_DAT,LINE_SIZE,FALSE);
000015B2  3  VAR_COL  := 16;
000015BC  3  MOD_COL  := 5;
000015C2  3  STATUS_COL := 25;
000015C8  3  PROC_COL := 44;
000015CE  3  FILE_COL := 60;
000015D4  3  LABEL_MOD := FALSE;
000015D8  3  FMT_SPEC(DISPLAY,SPEC_END);
000015F0  3  OUTPUT_LINE(DISPLAY);
00001600  3  END;
00000000  2
00000000  2  {***************************************************************************}
00000000  2  {*                  time modules                                           *}
00000000  2  {***************************************************************************}
```

```
00000000  2  PROCEDURE FORMAT_TIME_MODULES;
00000000  3  VAR
00000000  3  $EXTVAR+$
00000000  3  $FARS
00000000  3      TITLE_MOD : PTR;
00000000  3      TIME : PTR;
00000000  3      MODULES : PTR;
00000000  3  $BASE_PAGES
00000000  3  $EXTVAR-$
00001608  3  BEGIN
00001608  3  FMT_KEYWORD(DISPLAY,TIME,LINE_SIZE,TRUE);
0000162A  3  FMT_KEYWORD(DISPLAY,MODULES,LINE_SIZE,FALSE);
0000164A  3  OUTPUT_LINE(DISPLAY);
0000165A  3  OUTPUT_LINE(DISPLAY);
0000166A  3  FMT_KEYWORD(DISPLAY,TITLE_MOD,LINE_SIZE,FALSE);
0000168A  3  MOD_COL := 5;
00001694  3  FILE_COL := 21;
0000169A  3  LABEL_MOD := FALSE;
0000169E  3  FMT_SPEC(DISPLAY,SPEC_END);
000016B6  3  OUTPUT_LINE(DISPLAY);
000016C6  3  END;
00000000  2
00000000  2  (****************************************************************************)
00000000  2  (*               count statements                                           *)
00000000  2  (****************************************************************************)
00000000  2  PROCEDURE FORMAT_COUNT_STATEMENTS;
00000000  3  VAR
00000000  3  $EXTVAR+$
00000000  3  $FARS
00000000  3      TITLE_STA : PTR;
00000000  3      COUNT : PTR;
00000000  3      STATEMENTS : PTR;
00000000  3  $BASE PAGES
00000000  3  $EXTVAR-$
000016CE  3  BEGIN
000016CE  3  FMT_KEYWORD(DISPLAY,COUNT,LINE_SIZE,TRUE),
000016F0  3  FMT_KEYWORD(DISPLAY,STATEMENTS,LINE_SIZE,FALSE);
00001710  3  OUTPUT_LINE(DISPLAY),
00001720  3  OUTPUT_LINE(DISPLAY);
00001730  3  FMT_KEYWORD(DISPLAY,TITLE_STA,LINE_SIZE,FALSE);
00001750  3  MOD_COL := 5;
0000175A  3  FILE_COL := 27;
00001760  3  LABEL_MOD := FALSE;
00001764  3  FMT_SPEC(DISPLAY,SPEC_END);
0000177C  3  OUTPUT_LINE(DISPLAY);
0000178C  3  END;
00000000  2
00000000  2  (****************************************************************************)
00000000  2  (*               break on                                                   *)
00000000  2  (****************************************************************************)
00000000  2  PROCEDURE FORMAT_BREAK_ON;
00000000  3  VAR
00000000  3  $EXTVAR+$
00000000  3  $FARS
00000000  3      TITLE_STA : PTR;
00000000  3      BREAK : PTR;
00000000  3  $BASE_PAGES
00000000  3  $EXTVAR-$
00001794  3  BEGIN
00001794  3  FMT_KEYWORD(DISPLAY,BREAK,LINE_SIZE,FALSE);
000017B4  3  OUTPUT_LINE(DISPLAY);
000017C4  3  OUTPUT_LINE(DISPLAY);
000017D4  3  FMT_KEYWORD(DISPLAY,TITLE_STA,LINE_SIZE,FALSE);
000017F4  3  MOD_COL := 5;
000017FE  3  FILE_COL := 27;
00001804  3  STATUS_COL := 21;
0000180A  3  LABEL_MOD := FALSE;
0000180E  3  FMT_SPEC(DISPLAY,SPEC_END);
00001826  3  OUTPUT_LINE(DISPLAY);
00001836  3  END;
00000000  2
00000000  2  (****************************************************************************)
00000000  2  (*               enable                                                     *)
00000000  2  (****************************************************************************)
```

```
00000000  2  PROCEDURE FORMAT_ENABLE;
00000000  3  VAR
00000000  3  $EXTVAR+$
00000000  3  $FARS
00000000  3      ENABLE : PTR;
00000000  3  (   off : PTR;  )
00000000  3      on : PTR;
00000000  3  $BASE_PAGES
00000000  3  $EXTVAR-$
0000183E  3  BEGIN
0000183E  3  IF NOT ((STACK_PTR^.OP_CODE = SPEC_OPERAND) AND (STACK_PTR^.OPERAND = SPEC_OP_OFF)) THEN
0000186A  3      BEGIN
0000186A  3      OUTPUT_LINE(DISPLAY);
00001876  3      FMT_KEYWORD(DISPLAY,ENABLE,LINE_SIZE,TRUE);
00001898  3      FMT_KEYWORD(DISPLAY,on,LINE_SIZE,FALSE);
000018B8  3      VAR_COL := 5;
000018C2  3      MOD_COL := 5;
000018C8  3      FMT_SPEC(DISPLAY,SPEC_END);
000018E0  3      OUTPUT_LINE(DISPLAY);
000018F0  3      END;
000018F0  3  END;
00000000  2
00000000  2  {***************************************************************************}
0000000C  2  {*               disable                                                   *}
00000000  2  {***************************************************************************}
00000000  2  PROCEDURE FORMAT_DISABLE;
00000000  3  VAR
00000000  3  $EXTVAR+$
00000000  3  $FARS
00000000  3      DISABLE : PTR;
00000000  3  (   off : PTR;  )
00000000  3      on : PTR;
00000000  3      window : PTR;
00000000  3  $BASE_PAGES
00000000  3      CONFIGURATION : CONFIG_REC_TYPE;
00000000  3  $EXTVAR-$
000018F8  3  BEGIN
000018F8  3  IF NOT ((STACK_PTR^.OP_CODE = SPEC_OPERAND) AND (STACK_PTR^.OPERAND = SPEC_OP_OFF)) THEN
00001924  3      BEGIN
00001924  3      OUTPUT_LINE(DISPLAY);
00001930  3      FMT_KEYWORD(DISPLAY,DISABLE,LINE_SIZE,TRUE);
00001952  3      IF CONFIGURATION.WINDOW THEN
0000195A  3           FMT_KEYWORD(DISPLAY,window,LINE_SIZE,TRUE);
0000197C  3      FMT_KEYWORD(DISPLAY,on,LINE_SIZE,FALSE);
0000199C  3      VAR_COL := 5;
000019A6  3      MOD_COL := 5;
000019AC  3      FMT_SPEC(DISPLAY,SPEC_END);
000019C4  3      OUTPUT_LINE(DISPLAY);
000019D4  3      END;
000019D4  3  END;
00000000  2
00000000  2  {***************************************************************************}
00000000  2  {*               defaults                                                  *}
00000000  2  {***************************************************************************}
00000000  2  PROCEDURE FORMAT_DEFAULTS;
00000000  3  VAR
00000000  3  $EXTVAR+$
00000000  3  $FARS
00000000  3      RUN_AT_EXECUTION : PTR;
00000000  3      from : PTR;
00000000  3      EXTERNAL_STIMULUS : PTR;
00000000  3      RECEIVE : PTR;
00000000  3      DRIVE : PTR;
00000000  3      trigger : PTR;
00000000  3      trigger_enable : PTR;
00000000  3      storage_enable : PTR;
00000000  3      on : PTR;
00000000  3      measurement_enable : PTR;
00000000  3      measurement_disable : PTR;
00000000  3      DEFAULT_PATH : PTR;
00000000  3      undefined : PTR;
00000000  3      block : PTR;
00000000  3      proc : PTR;
00000000  3      file : PTR;
```

```
00000000 3      REAL_TIME : PTR;
00000000 3      optional : PTR;
00000000 3      required : PTR;
00000000 3      COUNTER : PTR;
00000000 3      counts_states : PTR;
00000000 3      counts_time : PTR;
00000000 3      BREAK : PTR;
00000000 3      measurement_complete : PTR;
00000000 3      ABSOLUTE_FILE : PTR;
00000000 3      EMULATION_COMMAND_FILE : PTR;
00000000 3  SPASE_PAGES
00000000 3      DEFAULT_PROC : VECTORO_7;
00000000 3      DEFAULT_FILE : VECTORO_7;
00000000 3      DEFAULT_DISC : INT;
00000000 3      DEFAULT_LINE : INT;
00000000 3      CONFIGURATION : CONFIG_REC_TYPE;
00000000 3  SEXTVAR-5
00000000 3      TEMP_FILE : VECTORO_7;
00000010 3      TEMP_DISC : INT;
00000012 3      TEMP_ID : INT;
000019DC 3  BEGIN
000019DC 3  OUTPUT_LINE(DISPLAY);
000019EC 3  {******************** break on measurement complete ********************}
000019EC 3  IF CONFIGURATION.BREAK_MEAS_COMP THEN
000019F4 3      BEGIN
000019F4 3      FMT_KEYWORD(DISPLAY,BREAK,LINE_SIZE,FALSE);
00001A14 3      OUTPUT_LINE(DISPLAY);
00001A24 3      DISPLAY.COLUMN := 5;
00001A32 3      FMT_KEYWORD(DISPLAY,measurement_complete,LINE_SIZE,FALSE);
00001A52 3      OUTPUT_LINE(DISPLAY);
00001A62 3      OUTPUT_LINE(DISPLAY);
00001A72 3      END;
00001A72 3  {******************** run at_execution ********************}
00001A72 3  IF CONFIGURATION.RUN_AT_EXEC THEN
00001A7A 3      BEGIN
00001A7A 3      FMT_KEYWORD(DISPLAY,RUN_AT_EXECUTION,LINE_SIZE,TRUE);
00001A9C 3      FMT_KEYWORD(DISPLAY,from,LINE_SIZE,TRUE);
00001ABE 3      STACK_PTR := SPECABLE_TYPE_PTR(MEAS_SETUP[EXECUTION].SPEC);
00001ACC 3      VAR_COL := 5;
00001AD2 3      MOD_COL := 5;
00001AD8 3      STATUS_COL := 0;
00001ADC 3      PROC_COL := 0;
00001AE0 3      FILE_COL := 0;
00001AE4 3      FMT_SPEC(DISPLAY,SPEC_END);
00001AFC 3      OUTPUT_LINE(DISPLAY);
00001B0C 3      OUTPUT_LINE(DISPLAY);
00001B1C 3      END;
00001B1C 3  {******************** inb ********************}
00001B1C 3  IF CONFIGURATION.ENABLE_INB.DRIVE <> NO_WAY_JOSE THEN
00001B24 3      BEGIN
00001B24 3      FMT_KEYWORD(DISPLAY,DRIVE,LINE_SIZE,TRUE);
00001B46 3      FMT_KEYWORD(DISPLAY,EXTERNAL_STIMULUS,LINE_SIZE,TRUE);
00001B68 3      OUTPUT_LINE(DISPLAY);
00001B78 3      DISPLAY.COLUMN := 5;
00001B86 3      CASE CONFIGURATION.ENABLE_INB.DRIVE OF
00001B90 3           TRIGGER : FMT_KEYWORD(DISPLAY,trigger,LINE_SIZE,TRUE);
00001BB6 3           TRIGGER_ENABLE : FMT_KEYWORD(DISPLAY,trigger_enable,LINE_SIZE,TRUE);
00001BDC 3           STORAGE_ENABLE : FMT_KEYWORD(DISPLAY,storage_enable,LINE_SIZE,TRUE);
00001C02 3           OTHERWISE ; {no error trap}
00001C02 3           END;
00001C28 3      FMT_KEYWORD(DISPLAY,measurement_enable,LINE_SIZE,FALSE);
00001C48 3      OUTPUT_LINE(DISPLAY);
00001C58 3      OUTPUT_LINE(DISPLAY);
00001C68 3      END;
00001C68 3  IF CONFIGURATION.DISABLE_INB.DRIVE <> NO_WAY_JOSE THEN
00001C70 3      BEGIN
00001C70 3      FMT_KEYWORD(DISPLAY,DRIVE,LINE_SIZE,TRUE);
00001C92 3      FMT_KEYWORD(DISPLAY,EXTERNAL_STIMULUS,LINE_SIZE,TRUE);
00001CB4 3      OUTPUT_LINE(DISPLAY);
00001CC4 3      DISPLAY.COLUMN := 5;
00001CD2 3      CASE CONFIGURATION.DISABLE_INB.DRIVE OF
00001CDC 3           TRIGGER : FMT_KEYWORD(DISPLAY,trigger,LINE_SIZE,TRUE);
00001D02 3           TRIGGER_ENABLE : FMT_KEYWORD(DISPLAY,trigger_enable,LINE_SIZE,TRUE);
```

```
00001D28  3          STORAGE_ENABLE : FMT_KEYWORD(DISPLAY,storage_enable,LINE_SIZE,TRUE);
00001D4E  3          OTHERWISE ; (no error trap)
00001D4E  3          END;
00001D74  3      FMT_KEYWORD(DISPLAY,measurement_disable,LINE_SIZE,FALSE);
00001D94  3      OUTPUT_LINE(DISPLAY);
00001DA4  3      OUTPUT_LINE(DISPLAY);
00001DB4  3      END;
00001DB4  3  IF CONFIGURATION.ENABLE_IMB.RECEIVE <> NO_WAY_JOSE THEN
00001DBC  3      BEGIN
00001DBC  3      FMT_KEYWORD(DISPLAY,RECEIVE,LINE_SIZE,TRUE);
00001DDE  3      FMT_KEYWORD(DISPLAY,EXTERNAL_STIMULUS,LINE_SIZE,TRUE);
00001E00  3      OUTPUT_LINE(DISPLAY);
00001E10  3      DISPLAY.COLUMN := 5;
00001E1E  3      CASE CONFIGURATION.ENABLE_IMB.RECEIVE OF
00001E28  3          TRIGGER : FMT_KEYWORD(DISPLAY,trigger,LINE_SIZE,TRUE);
00001E4E  3          TRIGGER_ENABLE : FMT_KEYWORD(DISPLAY,trigger_enable,LINE_SIZE,TRUE);
00001E74  3          STORAGE_ENABLE : FMT_KEYWORD(DISPLAY,storage_enable,LINE_SIZE,TRUE);
00001E9A  3          OTHERWISE ; (no error trap)
00001E9A  3          END;
00001EC0  3      FMT_KEYWORD(DISPLAY,measurement_enable,LINE_SIZE,FALSE);
00001EE0  3      OUTPUT_LINE(DISPLAY);
00001EF0  3      OUTPUT_LINE(DISPLAY);
00001F00  3      END;
00001F00  3  IF CONFIGURATION.DISABLE_IMB.RECEIVE <> NO_WAY_JOSE THEN
00001F08  3      BEGIN
00001F08  3      FMT_KEYWORD(DISPLAY,RECEIVE,LINE_SIZE,TRUE);
00001F2A  3      FMT_KEYWORD(DISPLAY,EXTERNAL_STIMULUS,LINE_SIZE,TRUE);
00001F4C  3      OUTPUT_LINE(DISPLAY);
00001F5C  3      DISPLAY.COLUMN := 5;
00001F6A  3      CASE CONFIGURATION.DISABLE_IMB.RECEIVE OF
00001F74  3          TRIGGER : FMT_KEYWORD(DISPLAY,trigger,LINE_SIZE,TRUE);
00001F9A  3          TRIGGER_ENABLE : FMT_KEYWORD(DISPLAY,trigger_enable,LINE_SIZE,TRUE);
00001FC0  3          STORAGE_ENABLE : FMT_KEYWORD(DISPLAY,storage_enable,LINE_SIZE,TRUE);
00001FE6  3          OTHERWISE ; (no error trap)
00001FE6  3          END;
0000200C  3      FMT_KEYWORD(DISPLAY,measurement_disable,LINE_SIZE,FALSE);
0000202C  3      OUTPUT_LINE(DISPLAY);
0000203C  3      OUTPUT_LINE(DISPLAY);
0000204C  3      END;
0000204C  3  (******************** default_path ********************)
0000204C  3  FMT_KEYWORD(DISPLAY,DEFAULT_PATH,LINE_SIZE,FALSE);
0000206C  3  OUTPUT_LINE(DISPLAY);
0000207C  3  DISPLAY.COLUMN := 5;
0000208A  3  IF DEFAULT_FILE[0] = 0020H THEN
00002096  3      BEGIN
00002096  3      FMT_KEYWORD(DISPLAY,undefined,LINE_SIZE,FALSE);
000020B6  3      END
000020BA  3  ELSE BEGIN
000020BA  3      IF DEFAULT_PROC[0] <> 0020H THEN
000020C6  3          BEGIN
000020C6  3          FMT_KEYWORD(DISPLAY,proc,LINE_SIZE,TRUE);
000020E8  3          FMT_IDENT(DISPLAY,DEFAULT_PROC,LINE_SIZE,TRUE);
00002108  3          END;
00002108  3  (*****************************************************************
00002108  3      IF DEFAULT_LINE <> -1 THEN
00002108  3          BEGIN
00002108  3          FMT_KEYWORD(DISPLAY,block,LINE_SIZE,TRUE);
00002108  3          FMT_INTEGER(DISPLAY,DEFAULT_LINE,10,LINE_SIZE,TRUE);
00002108  3          END;
00002108  3  *****************************************************************)
00002108  3      IF DEFAULT_FILE[0] <> 0020H THEN
00002114  3          BEGIN
00002114  3          FMT_KEYWORD(DISPLAY,file,LINE_SIZE,TRUE);
00002136  3          FMT_FILE(DISPLAY,DEFAULT_FILE,DEFAULT_DISC,LINE_SIZE,FALSE);
00002158  3          END;
00002158  3      END;
00002158  3  OUTPUT_LINE(DISPLAY);
00002168  3  OUTPUT_LINE(DISPLAY);
00002178  3  (******************** real_time ********************)
00002178  3  FMT_KEYWORD(DISPLAY,REAL_TIME,LINE_SIZE,FALSE);
00002198  3  OUTPUT_LINE(DISPLAY);
000021A8  3  DISPLAY.COLUMN := 5;
000021B6  3  IF CONFIGURATION.REAL_TIME THEN
000021BE  3      FMT_KEYWORD(DISPLAY,required,LINE_SIZE,FALSE)
000021E2  3  ELSE
```

```
000021E2  3      FMT_KEYWORD(DISPLAY,optional,LINE_SIZE,FALSE);
00002202  3   OUTPUT_LINE(DISPLAY);
00002212  3   OUTPUT_LINE(DISPLAY);
00002222  3   {******************** state_counter ********************}
00002222  3   FMT_KEYWORD(DISPLAY,COUNTER,LINE_SIZE,FALSE);
00002242  3   OUTPUT_LINE(DISPLAY);
00002252  3   DISPLAY.COLUMN := 5;
00002260  3   IF CONFIGURATION.COUNT_TIME THEN
00002268  3      FMT_KEYWORD(DISPLAY,counts_time,LINE_SIZE,FALSE)
0000228C  3   ELSE
0000228C  3      FMT_KEYWORD(DISPLAY,counts_states,LINE_SIZE,FALSE);
000022AC  3   OUTPUT_LINE(DISPLAY);
000022BC  3   OUTPUT_LINE(DISPLAY);
000022CC  3   {******************** absolute file name ********************}
000022CC  3   FMT_KEYWORD(DISPLAY,ABSOLUTE_FILE,LINE_SIZE,FALSE);
000022EC  3   OUTPUT_LINE(DISPLAY);
000022FC  3   DISPLAY.COLUMN := 5;
0000230A  3   IF CONFIGURATION.ABS_FILE[0] = 0020H THEN
00002316  3      FMT_KEYWORD(DISPLAY,undefined,LINE_SIZE,FALSE)
0000233A  3   ELSE BEGIN
0000233A  3      FMT_KEYWORD(DISPLAY,file,LINE_SIZE,TRUE);
0000235C  3      FMT_FILE(DISPLAY,CONFIGURATION.ABS_FILE,CONFIGURATION.ABS_DISC,LINE_SIZE,FALSE);
0000237E  3      END;
0000237E  3   OUTPUT_LINE(DISPLAY);
0000238E  3   OUTPUT_LINE(DISPLAY);
0000239E  3   {******************** emulation command file name ********************}
0000239E  3   FMT_KEYWORD(DISPLAY,EMULATION_COMMAND_FILE,LINE_SIZE,FALSE);
000023BE  3   OUTPUT_LINE(DISPLAY);
000023CE  3   DISPLAY.COLUMN := 5;
000023DC  3   IF CONFIGURATION.EMUL_FILE[0] = 0020H THEN
000023E8  3      FMT_KEYWORD(DISPLAY,undefined,LINE_SIZE,FALSE)
0000240C  3   ELSE BEGIN
0000240C  3      FMT_KEYWORD(DISPLAY,file,LINE_SIZE,TRUE);
0000242E  3      FMT_FILE(DISPLAY,CONFIGURATION.EMUL_FILE,CONFIGURATION.EMUL_DISC,LINE_SIZE,FALSE);
00002450  3      END;
00002450  3   OUTPUT_LINE(DISPLAY);
00002460  3   END;
00002468  2
00002468  2   {*********************************************************************}
00002468  2   {*                    SHOW_SETUP                                     *}
00002468  2   {*********************************************************************}
00002468  2   BEGIN
00002468  2   WITH DISPLAY DO BEGIN
00002470  2   ERASE_LINE(DISPLAY);
0000247C  2   LINE^ := HEADER^;
0000248E  2   OUTPUT_LINE(DISPLAY);
0000249A  2   OUTPUT_LINE(DISPLAY);
000024A6  2   VAR_COL := 0;
000024AA  2   MOD_COL := 0;
000024AE  2   STATUS_COL := 0;
000024B2  2   PROC_COL := 0;
000024B6  2   FILE_COL := 0;
000024BA  2   LABEL_MOD := TRUE;
000024C0  2   STACK_PTR := SPECABLE_TYPE_PTR(MEAS_SETUP[MEASUREMENT].SPEC);
000024CA  2   CASE OP_CODES(MEASUREMENT_TYPE) OF
000024D6  2      TR_VAR ,                 {trace variables}
000024D6  2      TR_ASN : BEGIN           {trace variables last_access}
000024D6  2           FORMAT_TRACE_VARIABLES;
000024E0  2           END;
000024E4  2      TR_DAT : BEGIN           {trace data_flow}
000024E4  2           FORMAT_TRACE_DATA_FLOW;
000024EE  2           END;
000024F2  2      TR_MOD : BEGIN           {trace modules}
000024F2  2           FORMAT_TRACE_MODULES;
000024FC  2           END;
00002500  2      TR_XXX ,                 {trace statements don't care}
00002500  2      TR_STA : BEGIN           {trace statements}
00002500  2           FORMAT_TRACE_STATEMENTS;
0000250A  2           END;
0000250E  2      TI_MOD : BEGIN           {time modules}
0000250E  2           FORMAT_TIME_MODULES;
00002518  2           END;
0000251C  2      CT_STA : BEGIN           {count statements}
0000251C  2           FORMAT_COUNT_STATEMENTS;
00002526  2           END;
```

```
0000252A  2      BRK_ON : BEGIN            {break on}
0000252A  2           FORMAT_BREAK_ON;
00002534  2           END;
00002538  2      OTHERWISE SYSTEM_MESSAGE(721,MEASUREMENT_TYPE,Error);
0000254A  2      END;
00002592  2  STACK_PTR := SPECABLE_TYPE_PTR(MEAS_SETUP[START_ON].SPEC);
0000258C  2  VAR_COL := 0;
00002590  2  MOD_COL := 0;
00002594  2  STATUS_COL := 0;
00002598  2  PROC_COL := 0;
0000259C  2  FILE_COL := 0;
000025A0  2  LABEL_MOD := TRUE;
000025A6  2  FORMAT_ENABLE;
000025B0  2  STACK_PTR := SPECABLE_TYPE_PTR(MEAS_SETUP[STOP_ON].SPEC);
000025BA  2  FORMAT_DISABLE;
000025C4  2  FORMAT_DEFAULTS;
000025CE  2  IF MAX_LINE > ROW THEN
000025DE  2      BEGIN
000025DE  2      HORIZONTAL := HORIZONTAL - (MAX_LINE - ROW) - 1;
000025F2  2      IF HORIZONTAL < 1 THEN
00002602  2           HORIZONTAL := 1;
00002608  2      ROW := -1;
00002612  2      MAX_LINE := 0;
00002618  2      SHOW_SETUP(DISPLAY);
00002626  2      END
0000262A  2  ELSE
0000262A  2      BEGIN
0000262A  2      MAX_LINE := ROW - 1;
00002638  2      IF NOT COPY_FLAG THEN
00002644  2           OUTPUT_SCREEN(DISPLAY);
00002650  2      END;
00002650  2  END;
00002650  2  END;
00000000  1  .

End of compilation, number of errors=    0
```

```
LOCATION OBJECT CODE LINE     SOURCE LINE

                      "68000"

                      KEY_ARRAY       MACRO &WORD
                      L_&WORD         DC.W EA&WORD-L_&WORD-2
                                      ASCII "&WORD"
                      EA&WORD
                                      MEND

                      SYMBOL_ARRAY    MACRO &NAME,&SYMBOL
                      L_&NAME         DC.W ES&NAME-L_&NAME-2
                                      ASCII &SYMBOL
                      ES&NAME
                                      MEND

                      KEY_WORD        MACRO &WORD
                                      GLOBAL &WORD
                      &WORD           DC.L SK&WORD
                      SK&WORD         DC.W EK&WORD-SK&WORD-2
                                      ASCII "&WORD"
                      EK&WORD
                                      MEND

                      KEY_WORD_U      MACRO &WORD
                                      GLOBAL &WORD
                      &WORD           DC.L SU&WORD
                      SU&WORD         DC.W EU&WORD-SU&WORD-2
                                      ASCII " &WORD"
                      EU&WORD
                                      MEND

                      SYMBOL          MACRO &NAME,&SYMBOL
                                      GLOBAL &NAME
                      &NAME           DC.L SS&NAME
                      SS&NAME         DC.W ES&NAME-SS&NAME-2
```

```
                 ASCII &SYMBOL
       ES&NAME
                 MEND

000000           KEY_WORD TRACE
00000B           KEY_WORD COUNT
000017           KEY_WORD TIME
000022           KEY_WORD BREAK

00002D           KEY_WORD VARIABLES
00003D           KEY_WORD last_access
00004F           KEY_WORD MODULES
00005D           KEY_WORD STATEMENTS
00006E           KEY_WORD DATA_FLOW

00007D           KEY_WORD read
000088           KEY_WORD write
000093           KEY_WORD read_write
0000A4           KEY_WORD entry_exit
0000B4           KEY_WORD entry
0000BF           KEY_WORD exit
0000C8           KEY_WORD module
0000D5           KEY_WORD line
0000E0           KEY_WORD to
0000EB           KEY_WORD any_state
0000F7           KEY_WORD all

000101           KEY_WORD ENABLE
00010E           KEY_WORD DISABLE

00011B           KEY_WORD RUN_AT_EXECUTION
000132           KEY_WORD EXTERNAL_STIMULUS
000149           KEY_WORD RECEIVE
000157           KEY_WORD DRIVE
000163           KEY_WORD DEFAULT_PATH
000176           KEY_WORD REAL_TIME
000185           KEY_WORD COUNTER
000193           KEY_WORD ABSOLUTE_FILE
0001A7           KEY_WORD EMULATION_COMMAND_FILE

0001C4           KEY_WORD off
0001CD           KEY_WORD on
0001D6           KEY_WORD or
0001DE           KEY_WORD followed_by
0001EF           KEY_WORD from
0001FA           KEY_WORD next_pc
000207           KEY_WORD transfer_address
00021E           KEY_WORD address
00022B           KEY_WORD undefined
00023B           KEY_WORD dont_care
00024B           KEY_WORD block
000257           KEY_WORD proc
000262           KEY_WORD file
00026C           KEY_WORD optional
00027A           KEY_WORD required
000288           KEY_WORD counts_states
00029B           KEY_WORD counts_time
0002AD           KEY_WORD trigger
0002BB           KEY_WORD trigger_enable
0002D0           KEY_WORD storage_enable
0002E4           KEY_WORD measurement_complete
0002FE           KEY_WORD measurement_enable
000316           KEY_WORD measurement_disable
00032F           KEY_WORD window

00033C           SYMBOL RIGHT_BRACKET,"]"
000343           SYMBOL LEFT_BRACKET,"["
00034B           SYMBOL RPAREN,")"
000353           SYMBOL LPAREN,"("
00035B           SYMBOL UP_ARROW,"^"
000363           SYMBOL RIGHT_ARROW,"->"
00036C           SYMBOL STAR,"*"
000373           SYMBOL PERIOD,"."
00037B           SYMBOL COMMA,","
000383           SYMBOL COLON,":"
```

```
00038B                        SYMBOL ATS,"@"
000393                        SYMBOL EQUAL,"="
                  *           SYMBOL NOT_EQUAL,"<>"
                  *           SYMBOL GREATER_THAN,">"
                  *           SYMBOL LESS_THAN,"<"
                  *           SYMBOL LESS_EQUAL,"<="
                  *           SYMBOL GREATER_EQUAL,">="

00039D                        KEY_WORD setup
0003A7                        KEY_WORD trace
0003B3                        KEY_WORD count_statements
0003CA                        KEY_WORD time_modules
0003DC                        KEY_WORD break
0003E7                        KEY_WORD variables
0003F7                        KEY_WORD data_flow
000407                        KEY_WORD modules
000415                        KEY_WORD statements

000426                  SYMBOL TITLE_VAR,"     variable              proc        file          status  "
00047B                  SYMBOL TITLE_DAT,"     module   variable              proc        file         "
0004D1                  SYMBOL TITLE_MOD,"     module        file        "
000500                  SYMBOL TITLE_STA,"     module / line       file       "

                              GLOBAL DISPLAY_FIELDS

000534 00000558   DISPLAY_FIELDS  DC.L L_symbol
000538 00000560               DC.L L_value
00053C 00000568               DC.L L_status
000540 00000570               DC.L L_count_absolute
000544 00000580               DC.L L_count_relative
000548 00000590               DC.L L_count_stat
00054C 000005A2               DC.L L_source
000550 000005AA               DC.L L_symbol_path
000554 000005B8               DC.L L_source_path

000558                        KEY_ARRAY symbol
000560                        KEY_ARRAY value
000567                        KEY_ARRAY status
000570                        SYMBOL_ARRAY count_absolute,"count absolute"
000580                        SYMBOL_ARRAY count_relative,"count relative"
000590                        SYMBOL_ARRAY count_stat,"count statistics"
0005A2                        KEY_ARRAY source
0005AA                        KEY_ARRAY symbol_path
0005B7                        KEY_ARRAY source_path

0005C5                        KEY_WORD display
0005D3                        KEY_WORD then

                              END

Errors=    0

        "68000"
 ******************************************************************************
 ********** DISPLAY STUFF *****************************************************
 ******************************************************************************
 * The monitor/display communications structure type DISPLAYSPEC contains    *
 * two fields, CURRENT_FORMAT, DEFAULT_FORMAT: FMT_PTR which point to the     *
 * arrays defined by this file.  The arrays are initially identical.          *
 * The monitor may read the DEFAULT_FORMAT array and write to the CURRENT_FORMAT *
 * array.  The display software reads only the CURRENT_FORMAT array.          *
 ******************************************************************************
 *FIELD          = RECORD                                                     *
 *  IDENT        : INT;                                                       *
 *  WIDTH        : INT;          (*CONTROLS # OF CHARACTES TO BE DISPLAYED*)  *
 *  END;                                                                      *
 *FMT            = ARRAY[0..9] OF FIELD; (*DEFINES FIELDS AND ORDER)          *
 *FMT_PTR        = ^FMT;                                                      *
 ******************************************************************************
                 DATA
 *********** IDENT VALUES **********)
<0000>   SYMBOL_FIELD     EQU 0
<0001>   VALUE_FIELD      EQU 1
<0002>   STATUS_FIELD     EQU 2
<0003>   KC?A_FIELD_ABS   EQU 3
```

```
          <0004>   KC9A_FIELD_REL      EQU 4
          <0005>   KC9A_FIELD_TIME     EQU 5
          <0006>   SOURCE_FIELD        EQU 6
          <0007>   SYMBOLPATH_FIELD    EQU 7
          <0008>   SOURCEPATH_FIELD    EQU 8
          <000A>   TERMINAT            EQU 10
                                       GLOBAL CURRENT_FORMATS
000000 0000011C    CURRENT_FORMATS     DC.L  CURRENT_TRACEVARIABLES     MEASURMENT TYPE=0  TRACE VARIABLES
000004 0000 0000                       DC.L  0                          MEASURMENT TYPE=1  TRACE ASSIGNMENTS
000008 0000017E                        DC.L  CURRENT_TRACEDATAFLOW      MEASURMENT TYPE=2  TRACE DATAFLOW
00000C 000001E0                        DC.L  CURRENT_TRACEMODULES       MEASURMENT TYPE=3  TRACE MODULES
000010 00000242                        DC.L  CURRENT_TRACESTATEMENTS    MEASURMENT TYPE=4  TRACE STATMENTS
000014 00000306                        DC.L  CURRENT_TRACEDONTCARE      MEASURMENT TYPE=5  TRACE DONTCARE
000018 000002A4                        DC.L  CURRENT_DISPLAYVARIABLE    MEASURMENT TYPE=6  DISPLAY VARIABLE
00001C 000002A4                        DC.L  CURRENT_DISPLAYVARIABLE    MEASURMENT TYPE=7  MODIFY VARIABLE
000020 00000368                        DC.L  CURRENT_TIMEMODULES        MEASURMENT TYPE=8  TIME MODULES
000024 0000 0000                       DC.L  0                          MEASURMENT TYPE=9  TIME STATEMENTS
000028 0000 0000                       DC.L  0                          MEASURMENT TYPE=10 COUNT MODULES
00002C 000003CA                        DC.L  CURRENT_COUNTSTATEMENTS    MEASURMENT TYPE=11 COUNT STATEMENTS
000030 00000306                        DC.L  CURRENT_TRACEDONTCARE      MEASURMENT TYPE=12 BREAK ON
                                       GLOBAL DEFAULT_FORMATS
000034 000000F4    DEFAULT_FORMATS     DC.L  DEFAULT_TRACEVARIABLES     MEASURMENT TYPE=0  TRACE VARIABLES
000038 0000 0000                       DC.L  0                          MEASURMENT TYPE=1  TRACE ASSIGNMENTS
00003C 00000156                        DC.L  DEFAULT_TRACEDATAFLOW      MEASURMENT TYPE=2  TRACE DATAFLOW
000040 000001B8                        DC.L  DEFAULT_TRACEMODULES       MEASURMENT TYPE=3  TRACE MODULES
000044 0000021A                        DC.L  DEFAULT_TRACESTATEMENTS    MEASURMENT TYPE=4  TRACE STATMENTS
000048 000002DE                        DC.L  DEFAULT_TRACEDONTCARE      MEASURMENT TYPE=5  TRACE DONTCARE
00004C 0000027C                        DC.L  DEFAULT_DISPLAYVARIABLE    MEASURMENT TYPE=6  DISPLAY VARIABLE
000050 0000027C                        DC.L  DEFAULT_DISPLAYVARIABLE    MEASURMENT TYPE=7  MODIFY VARIABLE
000054 00000340                        DC.L  DEFAULT_TIMEMODULES        MEASURMENT TYPE=8  TIME MODULES
000058 0000 0000                       DC.L  0                          MEASURMENT TYPE=9  TIME STATEMENTS
00005C 0000 0000                       DC.L  0                          MEASURMENT TYPE=10 COUNT MODULES
000060 000003A2                        DC.L  DEFAULT_COUNTSTATEMENTS    MEASURMENT TYPE=11 COUNT STATEMENTS
000064 000002DE                        DC.L  DEFAULT_TRACEDONTCARE      MEASURMENT TYPE=12 BREAK ON
                                       GLOBAL FIELDS
000068 000000E2    FIELDS              DC.L  FIELDS_TRACEVARIABLES      MEASURMENT TYPE=0  TRACE VARIABLES
00006C 0000 0000                       DC.L  0                          MEASURMENT TYPE=1  TRACE ASSIGNMENTS
000070 00000144                        DC.L  FIELDS_TRACEDATAFLOW       MEASURMENT TYPE=2  TRACE DATAFLOW
000074 000001A6                        DC.L  FIELDS_TRACEMODULES        MEASURMENT TYPE=3  TRACE MODULES
000078 00000208                        DC.L  FIELDS_TRACESTATEMENTS     MEASURMENT TYPE=4  TRACE STATMENTS
00007C 000002CC                        DC.L  FIELDS_TRACEDONTCARE       MEASURMENT TYPE=5  TRACE DONTCARE
000080 0000026A                        DC.L  FIELDS_DISPLAYVARIABLE     MEASURMENT TYPE=6  DISPLAY VARIABLE
000084 0000026A                        DC.L  FIELDS_DISPLAYVARIABLE     MEASURMENT TYPE=7  MODIFY VARIABLE
000088 0000032E                        DC.L  FIELDS_TIMEMODULES         MEASURMENT TYPE=8  TIME MODULES
00008C 0000 0000                       DC.L  0                          MEASURMENT TYPE=9  TIME STATEMENTS
000090 0000 0000                       DC.L  0                          MEASURMENT TYPE=10 COUNT MODULES
000094 00000390                        DC.L  FIELDS_COUNTSTATEMENTS     MEASURMENT TYPE=11 COUNT STATEMENTS
000098 000002CC                        DC.L  FIELDS_TRACEDONTCARE       MEASURMENT TYPE=12 BREAK ON
                                       GLOBAL TEMP_FORMAT,TEMP_FIELD
00009C             TEMP_FORMAT         DS.W  10*2                       BRETT'S TEMPORAY FORMAT TABLE 10 FIELDS, 4WORDS  EACH
0000C4             TEMP_FIELD          DS.W  2                          BRETT'S TEMPORAY FIELD  OF 4 WORDS
                                       GLOBAL SOFTKEY_FORMATS
0000C8 0020        SOFTKEY_FORMATS     DC.W  0002OH                     MEASURMENT TYPE=0  TRACE VARIABLES
0000CA 0000                            DC.W  0                          MEASURMENT TYPE=1  TRACE ASSIGNMENTS
0000CC 02E0                            DC.W  002E0H                     MEASURMENT TYPE=2  TRACE DATAFLOW
0000CE 2020                            DC.W  02020H                     MEASURMENT TYPE=3  TRACE MODULES
0000D0 0020                            DC.W  00020H                     MEASURMENT TYPE=4  TRACE STATMENTS
0000D2 E420                            DC.W  0E420H                     MEASURMENT TYPE=5  TRACE DONTCARE
0000D4 1EE0                            DC.W  01EE0H                     MEASURMENT TYPE=6  DISPLAY VARIABLE
0000D6 1EE0                            DC.W  01EE0H                     MEASURMENT TYPE=7  MODIFY VARIABLE
0000D8 3CC0                            DC.W  03CC0H                     MEASURMENT TYPE=8  TIME MODULES
0000DA 0000                            DC.W  0                          MEASURMENT TYPE=9  TIME STATEMENTS
0000DC 0000                            DC.W  0                          MEASURMENT TYPE=10 COUNT MODULES
0000DE E460                            DC.W  0E460H                     MEASURMENT TYPE=11 COUNT STATEMENTS
0000E0 E420                            DC.W  0E420H                     MEASURMENT TYPE=12 BREAK ON
```

```
LOCATION OBJECT CODE LINE     SOURCE LINE

                         ****************************************************************************
                         *********** TRACE VARIABLES *************************************************
                         ****************************************************************************
0000E2 0000              FIELDS_TRACEVARIABLES    DC.W   0              INDEX TO SYMBOL_FIELD
0000E4 0001                                       DC.W   1              INDEX TO VALUE_FIELD
0000E6 0002                                       DC.W   2              INDEX TO STATUS_FIELD
0000E8 0008                                       DC.W   8              INDEX TO KC9A_FIELD_ABS
0000EA 0003                                       DC.W   3              INDEX TO KC9A_FIELD_REL
0000EC FFFF                                       DC.W  -1              INDEX TO KC9A_FIELD_TIME
0000EE 0004                                       DC.W   4              INDEX TO SOURCE_FIELD
0000F0 0006                                       DC.W   6              INDEX TO SYMBOLPATH_FIELD
0000F2 0007                                       DC.W   7              INDEX TO SOURCEPATH_FIELD

        <00F4>           DEFAULT_TRACEVARIABLES   EQU    $
0000F4 0000                                       DC.W   SYMBOL_FIELD       FIELD IDENTIFIER 0
0000F6 0014                                       DC.W   20                 WIDTH
0000F8 0001                                       DC.W   VALUE_FIELD        FIELD IDENTIFIER 1
0000FA 000C                                       DC.W   12                 WIDTH
0000FC 0002                                       DC.W   STATUS_FIELD       FIELD IDENTIFIER 2
0000FE 0005                                       DC.W   5                  WIDTH
000100 0004                                       DC.W   KC9A_FIELD_REL     FIELD IDENTIFIER 3
000102 0009                                       DC.W   9                  WIDTH
000104 0006                                       DC.W   SOURCE_FIELD       FIELD IDENTIFIER 4
000106 004B                                       DC.W   75                 WIDTH
000108 000A                                       DC.W   TERMINAT           FIELD IDENTIFIER 5
00010A 0000                                       DC.W   0                  WIDTH
00010C 0007                                       DC.W   SYMBOLPATH_FIELD   FIELD IDENTIFIER 6
00010E 000F                                       DC.W   15                 WIDTH
000110 0008                                       DC.W   SOURCEPATH_FIELD   FIELD IDENTIFIER 7
000112 000F                                       DC.W   15                 WIDTH
000114 0003                                       DC.W   KC9A_FIELD_ABS     FIELD IDENTIFIER 8
000116 0009                                       DC.W   9                  WIDTH
000118 0000                                       DC.W   0                  FIELD IDENTIFIER 9
00011A 0000                                       DC.W   0                  WIDTH

        <011C>           CURRENT_TRACEVARIABLES   EQU    $
00011C 0000                                       DC.W   SYMBOL_FIELD       FIELD IDENTIFIER 0
00011E 0014                                       DC.W   20                 WIDTH
000120 0001                                       DC.W   VALUE_FIELD        FIELD IDENTIFIER 1
000122 000C                                       DC.W   12                 WIDTH
000124 0002                                       DC.W   STATUS_FIELD       FIELD IDENTIFIER 2
000126 0005                                       DC.W   5                  WIDTH
000128 0004                                       DC.W   KC9A_FIELD_REL     FIELD IDENTIFIER 3
00012A 0009                                       DC.W   9                  WIDTH
00012C 0006                                       DC.W   SOURCE_FIELD       FIELD IDENTIFIER 4
00012E 004B                                       DC.W   75                 WIDTH
000130 000A                                       DC.W   TERMINAT           FIELD IDENTIFIER 5
000132 0000                                       DC.W   0                  WIDTH
000134 0007                                       DC.W   SYMBOLPATH_FIELD   FIELD IDENTIFIER 6
000136 000F                                       DC.W   15                 WIDTH
000138 0008                                       DC.W   SOURCEPATH_FIELD   FIELD IDENTIFIER 7
00013A 000F                                       DC.W   15                 WIDTH
00013C 0003                                       DC.W   KC9A_FIELD_ABS     FIELD IDENTIFIER 8
00013E 0009                                       DC.W   9                  WIDTH
000140 0000                                       DC.W   0                  FIELD IDENTIFIER 9
000142 0000                                       DC.W   0                  WIDTH
                         ****************************************************************************
                         *********** TRACE DATAFLOW **************************************************
                         ****************************************************************************
000144 0000              FIELDS_TRACEDATAFLOW     DC.W   0              INDEX TO SYMBOL_FIELD
000146 0001                                       DC.W   1              INDEX TO VALUE_FIELD
000148 0002                                       DC.W   2              INDEX TO STATUS_FIELD
00014A FFFF                                       DC.W  -1              INDEX TO KC9A_FIELD_ABS
00014C FFFF                                       DC.W  -1              INDEX TO KC9A_FIELD_REL
00014E FFFF                                       DC.W  -1              INDEX TO KC9A_FIELD_TIME
000150 0003                                       DC.W   3              INDEX TO SOURCE_FIELD
000152 0005                                       DC.W   5              INDEX TO SYMBOLPATH_FIELD
000154 0006                                       DC.W   6              INDEX TO SOURCEPATH_FIELD

        <0156>           DEFAULT_TRACEDATAFLOW    EQU    $
000156 0000                                       DC.W   SYMBOL_FIELD       FIELD IDENTIFIER 0
```

```
00015A 0014            DC.W  20                FIELD IDENTIFIER
00015A 0001            DC.W  VALUE_FIELD       FIELD IDENTIFIER 1
00015C 000C            DC.W  12                WIDTH
00015E 0002            DC.W  STATUS_FIELD      FIELD IDENTIFIER 2
000160 0005            DC.W  5                 WIDTH
000162 0006            DC.W  SOURCE_FIELD      FIELD IDENTIFIER 3
000164 0055            DC.W  85                WIDTH
000166 000A            DC.W  TERMINAT          FIELD IDENTIFIER 4
000168 0000            DC.W  0                 WIDTH
00016A 0007            DC.W  SYMBOLPATH_FIELD  FIELD IDENTIFIER 5
00016C 000F            DC.W  15                WIDTH
00016E 0008            DC.W  SOURCEPATH_FIELD  FIELD IDENTIFIER 6
000170 000F            DC.W  15                WIDTH
000172 0000            DC.W  0                 FIELD IDENTIFIER 7
000174 0000            DC.W  0                 WIDTH
000176 0000            DC.W  0                 FIELD IDENTIFIER 8
000178 0000            DC.W  0                 WIDTH
00017A 0000            DC.W  0                 FIELD IDENTIFIER 9
00017C 0000            DC.W  0                 WIDTH

       <017E>  CURRENT_TRACEDATAFLOW  EQU  $
00017E 0000            DC.W  SYMBOL_FIELD      FIELD IDENTIFIER 0
000180 0014            DC.W  20                WIDTH
000182 0001            DC.W  VALUE_FIELD       FIELD IDENTIFIER 1
000184 000C            DC.W  12                WIDTH
000186 0002            DC.W  STATUS_FIELD      FIELD IDENTIFIER 2
000188 0005            DC.W  5                 WIDTH
00018A 0006            DC.W  SOURCE_FIELD      FIELD IDENTIFIER 3
00018C 0055            DC.W  85                WIDTH
00018E 000A            DC.W  TERMINAT          FIELD IDENTIFIER 4
000190 0000            DC.W  0                 WIDTH
000192 0007            DC.W  SYMBOLPATH_FIELD  FIELD IDENTIFIER 5
000194 000F            DC.W  15                WIDTH
000196 0008            DC.W  SOURCEPATH_FIELD  FIELD IDENTIFIER 6
000198 000F            DC.W  15                WIDTH
00019A 0000            DC.W  0                 FIELD IDENTIFIER 7
00019C 0000            DC.W  0                 WIDTH
00019E 0000            DC.W  0                 FIELD IDENTIFIER 8
0001A0 0000            DC.W  0                 WIDTH
0001A2 0000            DC.W  0                 FIELD IDENTIFIER 9
0001A4 0000            DC.W  0                 WIDTH
               ****************************************************************************
               ***********  TRACE MODULES  ************************************************
               ****************************************************************************
0001A6 0000    FIELDS_TRACEMODULES    DC.W  0      INDEX TO SYMBOL_FIELD
0001A8 FFFF            DC.W  -1                INDEX TO VALUE_FIELD
0001AA 0001            DC.W  1                 INDEX TO STATUS_FIELD
0001AC 0007            DC.W  7                 INDEX TO KC9A_FIELD_ABS
0001AE 0002            DC.W  2                 INDEX TO KC9A_FIELD_REL
0001B0 FFFF            DC.W  -1                INDEX TO KC9A_FIELD_TIME
0001B2 0003            DC.W  3                 INDEX TO SOURCE_FIELD
0001B4 0005            DC.W  5                 INDEX TO SYMBOLPATH_FIELD
0001B6 0006            DC.W  6                 INDEX TO SOURCEPATH_FIELD

       <01B8>  DEFAULT_TRACEMODULES   EQU  $
0001B8 0000            DC.W  SYMBOL_FIELD      FIELD IDENTIFIER 0
0001BA 0019            DC.W  25                WIDTH
0001BC 0002            DC.W  STATUS_FIELD      FIELD IDENTIFIER 1
0001BE 0005            DC.W  5                 WIDTH
0001C0 0004            DC.W  KC9A_FIELD_REL    FIELD IDENTIFIER 2
0001C2 0009            DC.W  9                 WIDTH
0001C4 0006            DC.W  SOURCE_FIELD      FIELD IDENTIFIER 3
0001C6 0053            DC.W  83                WIDTH
0001C8 000A            DC.W  TERMINAT          FIELD IDENTIFIER 4
0001CA 0000            DC.W  0                 WIDTH
0001CC 0007            DC.W  SYMBOLPATH_FIELD  FIELD IDENTIFIER 5
0001CE 000F            DC.W  15                WIDTH
0001D0 0008            DC.W  SOURCEPATH_FIELD  FIELD IDENTIFIER 6
0001D2 000F            DC.W  15                WIDTH
0001D4 0003            DC.W  KC9A_FIELD_ABS    FIELD IDENTIFIER 7
0001D6 0009            DC.W  9                 WIDTH
0001D8 0000            DC.W  0                 FIELD IDENTIFIER 8
0001DA 0000            DC.W  0                 WIDTH
0001DC 0000            DC.W  0                 FIELD IDENTIFIER 9
0001DE 0000            DC.W  0                 WIDTH
```

```
         <01E0>  CURRENT_TRACEMODULES   EQU   $
0001E0 0000                             DC.W  SYMBOL_FIELD      FIELD IDENTIFIER 0
0001E2 0019                             DC.W  25                WIDTH
0001E4 0002                             DC.W  STATUS_FIELD      FIELD IDENTIFIER 1
0001E6 0005                             DC.W  5                 WIDTH
0001E8 0004                             DC.W  KC9A_FIELD_REL    FIELD IDENTIFIER 2
0001EA 0009                             DC.W  9                 WIDTH
0001EC 0006                             DC.W  SOURCE_FIELD      FIELD IDENTIFIER 3
0001EE 0053                             DC.W  83                WIDTH
0001F0 000A                             DC.W  TERMINAT          FIELD IDENTIFIER 4
0001F2 0000                             DC.W  0                 WIDTH
0001F4 0007                             DC.W  SYMBOLPATH_FIELD  FIELD IDENTIFIER 5
0001F6 000F                             DC.W  15                WIDTH
0001F8 0008                             DC.W  SOURCEPATH_FIELD  FIELD IDENTIFIER 6
0001FA 000F                             DC.W  15                WIDTH
0001FC 0003                             DC.W  KC9A_FIELD_ABS    FIELD IDENTIFIER 7
0001FE 0009                             DC.W  9                 WIDTH
000200 0000                             DC.W  0                 FIELD IDENTIFIER 8
000202 0000                             DC.W  0                 WIDTH
000204 0000                             DC.W  0                 FIELD IDENTIFIER 9
000206 0000                             DC.W  0                 WIDTH
                 ****************************************************************************
                 ************ TRACE STATEMENTS ***********************************************
                 ****************************************************************************
000208 0001      FIELDS_TRACESTATEMENTS DC.W  1                 INDEX TO SYMBOL_FIELD
00020A 0002                             DC.W  2                 INDEX TO VALUE_FIELD
00020C 0003                             DC.W  3                 INDEX TO STATUS_FIELD
00020E 0008                             DC.W  8                 INDEX TO KC9A_FIELD_ABS
000210 0004                             DC.W  4                 INDEX TO KC9A_FIELD_REL
000212 FFFF                             DC.W  -1                INDEX TO KC9A_FIELD_TIME
000214 0000                             DC.W  0                 INDEX TO SOURCE_FIELD
000216 0006                             DC.W  6                 INDEX TO SYMBOLPATH_FIELD
000218 0007                             DC.W  7                 INDEX TO SOURCEPATH_FIELD

         <021A>  DEFAULT_TRACESTATEMENTS EQU  $
00021A 0006                             DC.W  SOURCE_FIELD      FIELD IDENTIFIER 0
00021C 0025                             DC.W  37                WIDTH
00021E 0000                             DC.W  SYMBOL_FIELD      FIELD IDENTIFIER 1
000220 000C                             DC.W  12                WIDTH
000222 0001                             DC.W  VALUE_FIELD       FIELD IDENTIFIER 2
000224 000C                             DC.W  12                WIDTH
000226 0002                             DC.W  STATUS_FIELD      FIELD IDENTIFIER 3
000228 0005                             DC.W  5                 WIDTH
00022A 0004                             DC.W  KC9A_FIELD_REL    FIELD IDENTIFIER 4
00022C 0009                             DC.W  9                 WIDTH
00022E 000A                             DC.W  TERMINAT          FIELD IDENTIFIER 5
000230 0000                             DC.W  0                 WIDTH
000232 0007                             DC.W  SYMBOLPATH_FIELD  FIELD IDENTIFIER 6
000234 000F                             DC.W  15                WIDTH
000236 0008                             DC.W  SOURCEPATH_FIELD  FIELD IDENTIFIER 7
000238 000F                             DC.W  15                WIDTH
00023A 0003                             DC.W  KC9A_FIELD_ABS    FIELD IDENTIFIER 8
00023C 0009                             DC.W  9                 WIDTH
00023E 0000                             DC.W  0                 FIELD IDENTIFIER 9
000240 0000                             DC.W  0                 WIDTH

         <0242>  CURRENT_TRACESTATEMENTS EQU  $
000242 0006                             DC.W  SOURCE_FIELD      FIELD IDENTIFIER 0
000244 0025                             DC.W  37                WIDTH
000246 0000                             DC.W  SYMBOL_FIELD      FIELD IDENTIFIER 1
000248 000C                             DC.W  12                WIDTH
00024A 0001                             DC.W  VALUE_FIELD       FIELD IDENTIFIER 2
00024C 000C                             DC.W  12                WIDTH
00024E 0002                             DC.W  STATUS_FIELD      FIELD IDENTIFIER 3
000250 0005                             DC.W  5                 WIDTH
000252 0004                             DC.W  KC9A_FIELD_REL    FIELD IDENTIFIER 4
000254 0009                             DC.W  9                 WIDTH
000256 000A                             DC.W  TERMINAT          FIELD IDENTIFIER 5
000258 0000                             DC.W  0                 WIDTH
00025A 0007                             DC.W  SYMBOLPATH_FIELD  FIELD IDENTIFIER 6
00025C 000F                             DC.W  15                WIDTH
00025E 0008                             DC.W  SOURCEPATH_FIELD  FIELD IDENTIFIER 7
000260 000F                             DC.W  15                WIDTH
```

```
000262 0003                                DC.W   KC9A_FIELD_ABS    FIELD IDENTIFIER 8
000264 0009                                DC.W   9                 WIDTH
000266 0000                                DC.W   0                 FIELD IDENTIFIER 9
000268 0000                                DC.W   0                 WIDTH

            ****************************************************************************
            ***********  DISPLAY VARIABLE***********************************************
            ****************************************************************************
00026A 0000        FIELDS_DISPLAYVARIABLE  DC.W  0                  INDEX TO SYMBOL_FIELD
00026C 0001                                DC.W  1                  INDEX TO VALUE_FIELD
00026E FFFF                                DC.W -1                  INDEX TO STATUS_FIELD
000270 FFFF                                DC.W -1                  INDEX TO KC9A_FIELD_ABS
000272 FFFF                                DC.W -1                  INDEX TO KC9A_FIELD_REL
000274 FFFF                                DC.W -1                  INDEX TO KC9A_FIELD_TIME
000276 FFFF                                DC.W -1                  INDEX TO SOURCE_FIELD
000278 0003                                DC.W  3                  INDEX TO SYMBOLPATH_FIELD
00027A FFFF                                DC.W -1                  INDEX TO SOURCEPATH_FIELD

       <027C>      DEFAULT_DISPLAYVARIABLE EQU   $
00027C 0000                                DC.W  SYMBOL_FIELD       FIELD IDENTIFIER 0
00027E 0014                                DC.W  20                 WIDTH
000280 0001                                DC.W  VALUE_FIELD        FIELD IDENTIFIER 1
000282 0014                                DC.W  20                 WIDTH
000284 000A                                DC.W  TERMINAT           FIELD IDENTIFIER 2
000286 0000                                DC.W  0                  WIDTH
000288 0007                                DC.W  SYMBOLPATH_FIELD   FIELD IDENTIFIER 3
00028A 000F                                DC.W  15                 WIDTH
00028C 0000                                DC.W  0                  FIELD IDENTIFIER 4
00028E 0000                                DC.W  0                  WIDTH
000290 0000                                DC.W  0                  FIELD IDENTIFIER 5
000292 0000                                DC.W  0                  WIDTH
000294 0000                                DC.W  0                  FIELD IDENTIFIER 6
000296 0000                                DC.W  0                  WIDTH
000298 0000                                DC.W  0                  FIELD IDENTIFIER 7
00029A 0000                                DC.W  0                  WIDTH
00029C 0000                                DC.W  0                  FIELD IDENTIFIER 8
00029E 0000                                DC.W  0                  WIDTH
0002A0 0000                                DC.W  0                  FIELD IDENTIFIER 9
0002A2 0000                                DC.W  0                  WIDTH

       <02A4>      CURRENT_DISPLAYVARIABLE EQU   $
0002A4 0000                                DC.W  SYMBOL_FIELD       FIELD IDENTIFIER 0
0002A6 0014                                DC.W  20                 WIDTH
0002A8 0001                                DC.W  VALUE_FIELD        FIELD IDENTIFIER 1
0002AA 0014                                DC.W  20                 WIDTH
0002AC 000A                                DC.W  TERMINAT           FIELD IDENTIFIER 2
0002AE 0000                                DC.W  0                  WIDTH
0002B0 0007                                DC.W  SYMBOLPATH_FIELD   FIELD IDENTIFIER 3
0002B2 000F                                DC.W  15                 WIDTH
0002B4 0000                                DC.W  0                  FIELD IDENTIFIER 4
0002B6 0000                                DC.W  0                  WIDTH
0002B8 0000                                DC.W  0                  FIELD IDENTIFIER 5
0002BA 0000                                DC.W  0                  WIDTH
0002BC 0000                                DC.W  0                  FIELD IDENTIFIER 6
0002BE 0000                                DC.W  0                  WIDTH
0002C0 0000                                DC.W  0                  FIELD IDENTIFIER 7
0002C2 0000                                DC.W  0                  WIDTH
0002C4 0000                                DC.W  0                  FIELD IDENTIFIER 8
0002C6 0000                                DC.W  0                  WIDTH
0002C8 0000                                DC.W  0                  FIELD IDENTIFIER 9
0002CA 0000                                DC.W  0                  WIDTH

            ****************************************************************************
            ***********  TRACE DONTCARE  ***********************************************
            ****************************************************************************
0002CC FFFF        FIELDS_TRACEDONTCARE    DC.W  -1                 INDEX TO SYMBOL_FIELD
0002CE FFFF                                DC.W  -1                 INDEX TO VALUE_FIELD
0002D0 FFFF                                DC.W  -1                 INDEX TO STATUS_FIELD
0002D2 0003                                DC.W   3                 INDEX TO KC9A_FIELD_ABS
0002D4 0004                                DC.W   4                 INDEX TO KC9A_FIELD_REL
0002D6 FFFF                                DC.W  -1                 INDEX TO KC9A_FIELD_TIME
0002D8 0000                                DC.W   0                 INDEX TO SOURCE_FIELD
0002DA FFFF                                DC.W  -1                 INDEX TO SYMBOLPATH_FIELD
0002DC 0001                                DC.W   1                 INDEX TO SOURCEPATH_FIELD
```

```
          <02DE>     DEFAULT_TRACEDONTCARE    EQU    $
0002DE 0006                                   DC.W   SOURCE_FIELD     FIELD IDENTIFIER 0
0002E0 003C                                   DC.W   60               WIDTH
0002E2 0008                                   DC.W   SOURCEPATH_FIELD FIELD IDENTIFIER 1
0002E4 0014                                   DC.W   20               WIDTH
0002E6 000A                                   DC.W   TERMINAT         FIELD IDENTIFIER 2
0002E8 0000                                   DC.W   0                WIDTH
0002EA 0003                                   DC.W   KC9A_FIELD_ABS   FIELD IDENTIFIER 3
0002EC 0009                                   DC.W   9                WIDTH
0002EE 0004                                   DC.W   KC9A_FIELD_REL   FIELD IDENTIFIER 4
0002F0 0009                                   DC.W   9                WIDTH
0002F2 0000                                   DC.W   0                FIELD IDENTIFIER 5
0002F4 0000                                   DC.W   0                WIDTH
0002F6 0000                                   DC.W   0                FIELD IDENTIFIER 6
0002F8 0000                                   DC.W   0                WIDTH
0002FA 0000                                   DC.W   0                FIELD IDENTIFIER 7
0002FC 0000                                   DC.W   0                WIDTH
0002FE 0000                                   DC.W   0                FIELD IDENTIFIER 8
000300 0000                                   DC.W   0                WIDTH
000302 0000                                   DC.W   0                FIELD IDENTIFIER 9
000304 0000                                   DC.W   0                WIDTH

          <0306>     CURRENT_TRACEDONTCARE    EQU    $
000306 0006                                   DC.W   SOURCE_FIELD     FIELD IDENTIFIER 0
000308 003C                                   DC.W   60               WIDTH
00030A 0008                                   DC.W   SOURCEPATH_FIELD FIELD IDENTIFIER 1
00030C 0014                                   DC.W   20               WIDTH
00030E 000A                                   DC.W   TERMINAT         FIELD IDENTIFIER 2
000310 0000                                   DC.W   0                WIDTH
000312 0003                                   DC.W   KC9A_FIELD_ABS   FIELD IDENTIFIER 3
000314 0009                                   DC.W   9                WIDTH
000316 0004                                   DC.W   KC9A_FIELD_REL   FIELD IDENTIFIER 4
000318 0009                                   DC.W   9                WIDTH
00031A 0000                                   DC.W   0                FIELD IDENTIFIER 5
00031C 0000                                   DC.W   0                WIDTH
00031E 0000                                   DC.W   0                FIELD IDENTIFIER 6
000320 0000                                   DC.W   0                WIDTH
000322 0000                                   DC.W   0                FIELD IDENTIFIER 7
000324 0000                                   DC.W   0                WIDTH
000326 0000                                   DC.W   0                FIELD IDENTIFIER 8
000328 0000                                   DC.W   0                WIDTH
00032A 0000                                   DC.W   0                FIELD IDENTIFIER 9
00032C 0000                                   DC.W   0                WIDTH
                     ******************************************************************************
                     ***********  TIME MODULES  ***************************************************
                     ******************************************************************************
00032E 0001          FIELDS_TIMEMODULES       DC.W    1               INDEX TO SYMBOL_FIELD
000330 FFFF                                   DC.W   -1               INDEX TO VALUE_FIELD
000332 FFFF                                   DC.W   -1               INDEX TO STATUS_FIELD
000334 FFFF                                   DC.W   -1               INDEX TO KC9A_FIELD_ABS
000336 FFFF                                   DC.W   -1               INDEX TO KC9A_FIELD_REL
000338 0000                                   DC.W    0               INDEX TO KC9A_FIELD_TIME
00033A FFFF                                   DC.W   -1               INDEX TO SOURCE_FIELD
00033C 0002                                   DC.W    2               INDEX TO SYMBOLPATH_FIELD
00033E FFFF                                   DC.W   -1               INDEX TO SOURCEPATH_FIELD

          <0340>     DEFAULT_TIMEMODULES      EQU    $
000340 0005                                   DC.W   KC9A_FIELD_TIME  FIELD IDENTIFIER 0
000342 0024                                   DC.W   36               WIDTH
000344 0000                                   DC.W   SYMBOL_FIELD     FIELD IDENTIFIER 1
000346 0010                                   DC.W   16               WIDTH
000348 0007                                   DC.W   SYMBOLPATH_FIELD FIELD IDENTIFIER 2
00034A 001C                                   DC.W   28               WIDTH
00034C 000A                                   DC.W   TERMINAT         FIELD IDENTIFIER 3
00034E 0000                                   DC.W   0                WIDTH
000350 0000                                   DC.W   0                FIELD IDENTIFIER 4
000352 0000                                   DC.W   0                WIDTH
000354 0000                                   DC.W   0                FIELD IDENTIFIER 5
000356 0000                                   DC.W   0                WIDTH
000358 0000                                   DC.W   0                FIELD IDENTIFIER 6
00035A 0000                                   DC.W   0                WIDTH
00035C 0000                                   DC.W   0                FIELD IDENTIFIER 7
00035E 0000                                   DC.W   0                WIDTH
000360 0000                                   DC.W   0                FIELD IDENTIFIER 8
```

```
000362 0000                                       DC.W   0                  WIDTH
000364 0000                                       DC.W   0                  FIELD IDENTIFIER 9
000366 0000                                       DC.W   0                  WIDTH

       <0368>  CURRENT_TIMEMODULES                EQU    $
000368 0005                                       DC.W   KC9A_FIELD_TIME    FIELD IDENTIFIER 0
00036A 0024                                       DC.W   36                 WIDTH
00036C 0000                                       DC.W   SYMBOL_FIELD       FIELD IDENTIFIER 1
00036E 0010                                       DC.W   16                 WIDTH
000370 0007                                       DC.W   SYMBOLPATH_FIELD   FIELD IDENTIFIER 2
000372 001C                                       DC.W   28                 WIDTH
000374 000A                                       DC.W   TERMINAT           FIELD IDENTIFIER 3
000376 0000                                       DC.W   0                  WIDTH
000378 0000                                       DC.W   0                  FIELD IDENTIFIER 4
00037A 0000                                       DC.W   0                  WIDTH
00037C 0000                                       DC.W   0                  FIELD IDENTIFIER 5
00037E 0000                                       DC.W   0                  WIDTH
000380 0000                                       DC.W   0                  FIELD IDENTIFIER 6
000382 0000                                       DC.W   0                  WIDTH
000384 0000                                       DC.W   0                  FIELD IDENTIFIER 7
000386 0000                                       DC.W   0                  WIDTH
000388 0000                                       DC.W   0                  FIELD IDENTIFIER 8
00038A 0000                                       DC.W   0                  WIDTH
00038C 0000                                       DC.W   0                  FIELD IDENTIFIER 9
00038E 0000                                       DC.W   0                  WIDTH
               ************************************************************************************
               ***********  COUNT STATEMENTS  *****************************************************
               ************************************************************************************
000390 FFFF            FIELDS_COUNTSTATEMENTS     DC.W   -1                 INDEX TO SYMBOL_FIELD
000392 FFFF                                       DC.W   -1                 INDEX TO VALUE_FIELD
000394 FFFF                                       DC.W   -1                 INDEX TO STATUS_FIELD
000396 0000                                       DC.W   0                  INDEX TO KC9A_FIELD_ABS
000398 FFFF                                       DC.W   -1                 INDEX TO KC9A_FIELD_REL
00039A FFFF                                       DC.W   -1                 INDEX TO KC9A_FIELD_TIME
00039C 0001                                       DC.W   1                  INDEX TO SOURCE_FIELD
00039E FFFF                                       DC.W   -1                 INDEX TO SYMBOLPATH_FIELD
0003A0 0003                                       DC.W   3                  INDEX TO SOURCEPATH_FIELD

       <03A2>  DEFAULT_COUNTSTATEMENTS            EQU    $
0003A2 0003                                       DC.W   KC9A_FIELD_ABS     FIELD IDENTIFIER 0
0003A4 0009                                       DC.W   9                  WIDTH
0003A6 0006                                       DC.W   SOURCE_FIELD       FIELD IDENTIFIER 1
0003A8 0047                                       DC.W   71                 WIDTH
0003AA 000A                                       DC.W   TERMINAT           FIELD IDENTIFIER 2
0003AC 0000                                       DC.W   0                  WIDTH
0003AE 0008                                       DC.W   SOURCEPATH_FIELD   FIELD IDENTIFIER 3
0003B0 000F                                       DC.W   15                 WIDTH
0003B2 0000                                       DC.W   0                  FIELD IDENTIFIER 4
0003B4 0000                                       DC.W   0                  WIDTH
0003B6 0000                                       DC.W   0                  FIELD IDENTIFIER 5
0003B8 0000                                       DC.W   0                  WIDTH
0003BA 0000                                       DC.W   0                  FIELD IDENTIFIER 6
0003BC 0000                                       DC.W   0                  WIDTH
0003BE 0000                                       DC.W   0                  FIELD IDENTIFIER 7
0003C0 0000                                       DC.W   0                  WIDTH
0003C2 0000                                       DC.W   0                  FIELD IDENTIFIER 8
0003C4 0000                                       DC.W   0                  WIDTH
0003C6 0000                                       DC.W   0                  FIELD IDENTIFIER 9
0003C8 0000                                       DC.W   0                  WIDTH

       <03CA>  CURRENT_COUNTSTATEMENTS            EQU    $
0003CA 0003                                       DC.W   KC9A_FIELD_ABS     FIELD IDENTIFIER 0
0003CC 0009                                       DC.W   9                  WIDTH
0003CE 0006                                       DC.W   SOURCE_FIELD       FIELD IDENTIFIER 1
0003D0 0047                                       DC.W   71                 WIDTH
0003D2 000A                                       DC.W   TERMINAT           FIELD IDENTIFIER 2
0003D4 0000                                       DC.W   0                  WIDTH
0003D6 0008                                       DC.W   SOURCEPATH_FIELD   FIELD IDENTIFIER 3
0003D8 000F                                       DC.W   15                 WIDTH
0003DA 0000                                       DC.W   0                  FIELD IDENTIFIER 4
0003DC 0000                                       DC.W   0                  WIDTH
0003DE 0000                                       DC.W   0                  FIELD IDENTIFIER 5
0003E0 0000                                       DC.W   0                  WIDTH
0003E2 0000                                       DC.W   0                  FIELD IDENTIFIER 6
```

```
0003E4 0000      544      DC.W   0      WIDTH
0003E6 0000      545      DC.W   0      FIELD IDENTIFIER 7
0003E8 0000      546      DC.W   0      WIDTH
0003EA 0000      547      DC.W   0      FIELD IDENTIFIER 8
0003EC 0000      548      DC.W   0      WIDTH
0003EE 0000      549      DC.W   0      FIELD IDENTIFIER 9
0003F0 0000      550      DC.W   0      WIDTH

      Errors=   0
```

```
00000000  1  "68000" PREPROCESS
00000000  1  $BASE_PAGE$
00000000  1  $WIDTH 120$
00000000  1
00000000  1  PROGRAM IMB_;
00000000  1
00000000  1  $EXTENSIONS ON$
00000000  1  $LID_ABS_LONG$
00000000  1  $WARN OFF$
00000000  1
00000000  1  CONST
00000000  1      MONITOR_PRI = -50;
00000000  1      MONITOR_CHAN = 06000CH;
00000000  1      IMB_PRI = -52;
00000000  1      IMB_CHAN = 06800CH;
00000000  1      ERROR_CODE = 0E00CH;
00000000  1
00000000  1  TYPE
00000000  1      INT = SIGNED_16;
00000000  1      INT_PTR = ^ INT;
00000000  1      PTR = ^ INTEGER;
00000000  1      VECTOR0_7 = ARRAY[0..7] OF INT;
00000000  1      IMGNAME = ARRAY[0..7] OF INT;
00000000  1      DOUBLE_WORD = RECORD
00000000  2                  LSW : INT;
00000000  2                  MSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE ICDS_68K:SODAME
00000000  1  #INCLUDE ICHILDREN:SODAMON
00000000  1  #INCLUDE ICMD_DATA:SODAMON
00000000  1  #INCLUDE ISPEC_DATA:SODAMON
00000000  1  #INCLUDE IDISPLAY:SODAMON
00000000  1  #INCLUDE INCLUDE:KIP
00000000  1
00000000  1  VAR
00000000  1  $EXTVAR+$
00000000  1      CDS : CDS_TYPE;
00000000  1      MEAS_SETUP : CMD_ARRAY;
00000000  1      PARM_REC : PARAMETER_TYPE;
00000000  1      DISPLAY_MASTER : DISPLAY_SPEC;
00000000  1      DYNAMIC_ID : INT;
00000000  1      DISPLAY_ID : INT;
00000000  1      CURRENT_DISPLAY : INT;
00000000  1      SYNT_ERRS : ARRAY[0..100] OF PTR;
00000000  1      VALID_FOOTDC : BOOLEAN;
00000000  1      MEASUREMENT_TYPE : INT;
00000000  1      MEAS_DISP_TYPE : INT;
00000000  1      CURRENT_FORMATS : ARRAY[0..2] OF FMT_PTR;
00000000  1      CONFIGURATION : CONFIG_REC_TYPE;
00000000  1      CMD_STACK : CMD_ARRAY_PTR;
00000000  1      DISPLAY : DISPLAY_TYPE;
00000000  1      STACK_AREA : ARRAY[0..1] OF INT;
00000000  1      IMB_STACK : ARRAY[0..1] OF INT;
00000000  1  $EXTVAR-$
00000000  1      SIGNAL : INTEGER;
00000000  1      DUMMY : INT;
00000006  1      ERROR : INT;
00000008  1      TEMP : INT;
0000000A  1
```

```
0000000A  1  $CALL_ABS_LONG ON$
00000000  1  PROCEDURE P_MESSAGE(ERROR_PTR : INTEGER; CODE : INT); EXTERNAL;
00000000  1  PROCEDURE BPC_WRITE(ADDR_68K : INTEGER; ADDR_BPC : INT; LENGTH : INT); EXTERNAL;
00000000  1  PROCEDURE WAKEUP_ (CHAN : INTEGER); EXTERNAL;
00000000  1  PROCEDURE READ_SIG_(ID : INT; VAR SIGNAL : INTEGER); EXTERNAL;
00000000  1  PROCEDURE SET_SIG_ (SIGNAL : INTEGER); EXTERNAL;
00000000  1  PROCEDURE SLEEP_ (CHAN : INTEGER; PRI : INT); EXTERNAL;
00000000  1  PROCEDURE READ_PRI_ (VAR PRI : INT); EXTERNAL;
00000000  1  PROCEDURE FORK_(ENTRY, STACK : INTEGER; VAR ID : INT); EXTERNAL;
00000000  1  PROCEDURE OUTIT(LETTER : CHAR; VALUE : INT; BASE : CHAR); EXTERNAL;
00000000  1  PROCEDURE RUN(ADDRESS : INTEGER; FLAG : INT; VAR ERROR : INT); EXTERNAL;
00000000  1  PROCEDURE EMUL_STATUS(ASK : INT; VAR ERROR : INT); EXTERNAL;
0000000A  1  $CALL_PC_SHORT ON$
00000000  1  PROCEDURE SYSTEM_MESSAGE(MESS_NUM, MESS_CODE : INT; MESSAGE : MESSAGE_TYPES); EXTERNAL;
00000000  1  PROCEDURE DISPLAY_SOMETHING(DISPLAY : INT; COPY : BOOLEAN); EXTERNAL;
00000000  1  PROCEDURE WRITE_SOFTKEY_FORMAT; EXTERNAL;
00000000  1
00000000  1  $GLOBPROC+$
00000000  1
00000000  1  PROCEDURE FORK_DYNAMIC;
00000000  2  LABEL 1;
00000000  2  VAR
00000000  2      ENTRY_PTR : PTR;
00000004  2      STACK_PTR : PTR;
00000008  2      SIGNAL : INTEGER;
0000000C  2      PRI : INT;
00000004  2  BEGIN
00000004  2  READ_PRI_(PRI);
00000010  2  READ_SIG_(DYNAMIC_ID,SIGNAL);
00000020  2  IF SIGNAL <> CHILD_DEAD THEN
00000028  2      BEGIN
00000028  2      SYSTEM_MESSAGE(421,0,Error);
00000038  2      WHILE TRUE DO;
0000003A  2      END;
0000003A  2  ENTRY_PTR := PTR(DYNAMIC_ENTRY_PTR);
00000042  2  STACK_PTR := PTR(DYNAMIC_STACK_PTR);
0000004A  2  SET_SIG_(INTEGER(ADDR(PARM_REC)));
00000058  2  FORK_(ENTRY_PTR^,STACK_PTR^,DYNAMIC_ID);
00000074  2  REPEAT
00000074  2      SLEEP_(1,PRI);
00000086  2      READ_SIG_(DYNAMIC_ID,SIGNAL);
00000096  2      UNTIL SIGNAL <> CHILD_DEAD;
0000009C  2  1 :
0000009C  2  END;
00000000  1
00000000  1  PROCEDURE FORK_STATIC;
00000000  2  LABEL 1;
00000000  2  VAR
00000000  2      ENTRY_PTR : PTR;
00000004  2      STACK_PTR : PTR;
00000008  2      SIGNAL : INTEGER;
0000000C  2      PRI : INT;
000000A4  2  BEGIN
000000A4  2  READ_PRI_(PRI);
000000B0  2  READ_SIG_(DYNAMIC_ID,SIGNAL);
000000C0  2  IF SIGNAL <> CHILD_DEAD THEN
000000C8  2      BEGIN
000000C8  2      SYSTEM_MESSAGE(431,0,Error);
000000D8  2      WHILE TRUE DO;
000000DA  2      END;
000000DA  2  ENTRY_PTR := PTR(STATIC_ENTRY_PTR);
000000E2  2  STACK_PTR := PTR(STATIC_STACK_PTR);
000000EA  2  SET_SIG_(INTEGER(ADDR(PARM_REC)));
000000F8  2  FORK_(ENTRY_PTR^,STACK_PTR^,DYNAMIC_ID);
00000114  2  REPEAT
00000114  2      SLEEP_(1,PRI);
00000126  2      READ_SIG_(DYNAMIC_ID,SIGNAL);
00000136  2      UNTIL SIGNAL <> CHILD_DEAD;
0000013C  2  1 :
0000013C  2  END;
00000000  1
00000000  1  PROCEDURE FORK_DISPLAY;
00000000  2  LABEL 1;
00000000  2  VAR
```

```
00000000  2      ENTRY_PTR : PTR;
00000004  2      STACK_PTR : PTR;
00000008  2      SIGNAL : INTEGER;
0000000C  2      PRI : INT;
00000144  2  BEGIN
00000144  2  READ_PRI_(PRI);
00000150  2  READ_SIG_(DISPLAY_ID,SIGNAL);
00000160  2  IF SIGNAL <> CHILD_DEAD THEN
00000168  2      BEGIN
00000168  2      SYSTEM_MESSAGE(441,0,Error);
00000178  2      WHILE TRUE DO;
0000017A  2      END;
0000017A  2  ENTRY_PTR := PTR(DISPLAY_ENTRY_PTR);
00000182  2  STACK_PTR := PTR(DISPLAY_STACK_PTR);
0000018A  2  IF CDS.REQUEST_TYPE <> INT(NO_MESSAGE) THEN
00000192  2      BEGIN
00000192  2      SET_SIG_(INTEGER(ADDR(DISPLAY_MASTER)));
000001A0  2      FORK_(ENTRY_PTR^,STACK_PTR^,DISPLAY_ID);
000001BC  2      REPEAT
000001BC  2           SLEEP_(1,PRI);
000001CE  2           READ_SIG_(DISPLAY_ID,SIGNAL);
000001DE  2           UNTIL SIGNAL <> CHILD_DEAD;
000001E4  2      END;
000001E4  2  1 :
000001E4  2  END;
00000000  1
00000000  1  PROCEDURE KILL_DYNAMIC;
00000000  2  VAR
00000000  2      SIGNAL : INTEGER;
00000004  2      PRI : INT;
000001EC  2  BEGIN
000001EC  2  READ_PRI_(PRI);
000001F8  2  READ_SIG_(DYNAMIC_ID,SIGNAL);
00000208  2  WHILE SIGNAL <> CHILD_DEAD DO
00000210  2      BEGIN
00000210  2      PARM_REC.ACTION := TERMINATE;
00000216  2      WAKEUP_(DYNAMIC_CHANL);
00000226  2      SLEEP_(1,PRI);
00000238  2      READ_SIG_(DYNAMIC_ID,SIGNAL);
00000248  2      END;
00000248  2  PARM_REC.ACTION := NO_ACTION;
0000024E  2  END;
00000000  1
00000000  1  PROCEDURE KILL_DISPLAY;
00000000  2  VAR
00000000  2      SIGNAL : INTEGER;
00000004  2      PRI : INT;
00000256  2  BEGIN
00000256  2  READ_PRI_(PRI);
00000262  2  CURRENT_DISPLAY := Setup;
00000268  2  READ_SIG_(DISPLAY_ID,SIGNAL);
00000278  2  WHILE SIGNAL <> CHILD_DEAD DO
00000280  2      BEGIN
00000280  2      DISPLAY_MASTER.CMD := TERMINATE;
00000286  2      WAKEUP_(DISPLAY_CHANL);
00000294  2      SLEEP_(1,PRI);
000002A6  2      READ_SIG_(DISPLAY_ID,SIGNAL);
000002B6  2      END;
000002B6  2  DISPLAY_MASTER.CMD := NO_ACTION;
000002BC  2  DISPLAY_SOMETHING(Current,FALSE);
000002C8  2  END;
00000000  1
00000000  1  PROCEDURE WAIT_FOR_DISPLAY;
00000000  2  VAR
00000000  2      SIGNAL : INTEGER;
00000004  2      PRI : INT;
000002D0  2  BEGIN
000002D0  2  READ_PRI_(PRI);
000002DC  2  READ_SIG_(DISPLAY_ID,SIGNAL);
000002EC  2  WHILE SIGNAL = CHILD_AWAKE DO
000002FA  2      BEGIN
000002FA  2      SLEEP_(1,PRI);
0000030C  2      READ_SIG_(DISPLAY_ID,SIGNAL);
0000031C  2      END;
```

```
0000031E  2  END;
00000000  1
00000000  1  PROCEDURE IMB_EXECUTE;
00000326  2  BEGIN
00000326  2  PARM_REC.ACTION := EXECUTE;
0000032E  2  WAKEUP_(DYNAMIC_CHANL);
0000033C  2  (**************************************************************
0000033C  2  KILL_DYNAMIC;
0000033C  2  KILL_DISPLAY;
0000033C  2  PARM_REC.CONFIG_PTR := INTEGER(ADDR(CONFIGURATION));
0000033C  2  DUMMY := 0001H;
0000033C  2  PARM_REC.COMMAND_PTR := INTEGER(ADDR(DUMMY));
0000033C  2  PARM_REC.CMD_STACK_PTR := INTEGER(MEAS_SETUP[MEASUREMENT].CMD);
0000033C  2  PARM_REC.ENA_STACK_PTR := INTEGER(MEAS_SETUP[START_ON].CMD);
0000033C  2  PARM_REC.DIS_STACK_PTR := INTEGER(MEAS_SETUP[STOP_ON].CMD);
0000033C  2  PARM_REC.ACTION := EXECUTE;
0000033C  2  FORK_DYNAMIC;
0000033C  2   **************************************************************)
0000033C  2  END;
00000000  1
00000000  1  PROCEDURE IMB_HALT;
00000344  2  BEGIN
00000344  2  PARM_REC.ACTION := HALT;
0000034C  2  WAKEUP_(DYNAMIC_CHANL);
0000035A  2  END;
00000000  1
00000000  1  PROCEDURE IMB_RESET;
00000362  2  BEGIN
00000362  2  KILL_DYNAMIC;
00000366  2  KILL_DISPLAY;
0000036A  2  PARM_REC.CONFIG_PTR := INTEGER(ADDR(CONFIGURATION));
00000372  2  DUMMY := 0001H;
00000378  2  PARM_REC.COMMAND_PTR := INTEGER(ADDR(DUMMY));
00000380  2  PARM_REC.CMD_STACK_PTR := INTEGER(MEAS_SETUP[MEASUREMENT].CMD);
00000386  2  PARM_REC.ENA_STACK_PTR := INTEGER(MEAS_SETUP[START_ON].CMD);
0000038C  2  PARM_REC.DIS_STACK_PTR := INTEGER(MEAS_SETUP[STOP_ON].CMD);
00000392  2  PARM_REC.ACTION := LOAD;
0000039A  2  FORK_DYNAMIC;
0000039E  2  END;
00000000  1
00000000  1  PROCEDURE MONITOR_IMB;
00000000  2  VAR
00000000  2      TEMP_REQUEST : INT;
000003A6  2  BEGIN
000003A6  2  WHILE TRUE DO
000003A6  2      BEGIN
000003A6  2      IF CDS.IMB_REQUEST = 0 THEN
000003AE  2           SLEEP_(IMB_CHAN,IMB_PRI);
000003C0  2      TEMP_REQUEST :=  CDS.IMB_REQUEST;
000003C6  2      CDS.IMB_REQUEST := 0;
000003CA  2      CASE TEMP_REQUEST OF
000003D4  2           0 : ;
000003D8  2           1 : IMB_EXECUTE;
000003E0  2           2 : IMB_HALT;
000003E8  2           3 : IMB_RESET;
000003F0  2           OTHERWISE SYSTEM_MESSAGE(411,CDS.IMB_REQUEST,Error);
00000402  2           END; .
00000428  2      READ_SIG_(DYNAMIC_ID,SIGNAL);
00000438  2      CASE SIGNAL OF
00000440  2           HALTED, COMPLETED :
00000440  2                BEGIN
00000440  2                IF (SIGNAL = HALTED) OR
00000440  2                   ((MEASUREMENT_TYPE <> INT(BRK_ON)) AND NOT CONFIGURATION.BREAK_MEAS_COMP) THEN
0000046E  2                     BEGIN
0000046E  2                     EMUL_STATUS(128,ERROR);
0000047E  2                     IF ERROR = 0 THEN
00000486  2                          RUN(0,0,ERROR);
0000049A  2                     END;
0000049A  2                VALID_FOOTDC := TRUE;
000004A0  2                DISPLAY_MASTER.LOCATION := 0;
000004A4  2                CURRENT_DISPLAY := Measurement;
000004AA  2                MEAS_DISP_TYPE := MEASUREMENT_TYPE;
000004B0  2                WRITE_SOFTKEY_FORMAT;
000004C4  2                DISPLAY_MASTER.CURRENT_FORMAT := CURRENT_FORMATS[MEAS_DISP_TYPE];
000004C4  2                FORK_DISPLAY;
000004C8  2                END;
```

```
000004CC  2            NO_DATA:
000004CC  2                BEGIN
000004CC  2                IF (MEASUREMENT_TYPE <> INT(BRK_ON)) AND NOT CONFIGURATION.BREAK_MEAS_COMP THEN
000004E8  2                    BEGIN
000004E8  2                    EMUL_STATUS(123,ERROR);
000004F8  2                    IF ERROR = 0 THEN
00000500  2                        RUN(0,0,ERROR);
00000514  2                    END;
00000514  2                VALID_FOOTDC := TRUE;
0000051A  2                CURRENT_DISPLAY := Setup;
00000520  2                MEAS_DISP_TYPE := MEASUREMENT_TYPE;
00000526  2                WRITE_SOFTKEY_FORMAT;
0000052A  2                DISPLAY_MASTER.CURRENT_FORMAT := CURRENT_FORMATS[MEAS_DISP_TYPE];
0000053A  2                END;
0000053E  2            SEMI_CATAST:
0000053E  2                BEGIN
0000053E  2                VALID_FOOTDC := TRUE;
00000544  2                DISPLAY_MASTER.LOCATION := 0;
00000548  2                CURRENT_DISPLAY := Measurement;
0000054E  2                MEAS_DISP_TYPE := MEASUREMENT_TYPE;
00000554  2                WRITE_SOFTKEY_FORMAT;
00000558  2                DISPLAY_MASTER.CURRENT_FORMAT := CURRENT_FORMATS[MEAS_DISP_TYPE];
00000568  2                FORK_DISPLAY;
0000056C  2                END;
00000570  2            CATASTROPHE:
00000570  2                BEGIN
00000570  2                CURRENT_DISPLAY := Setup;
00000576  2                TEMP := 1;
0000057C  2                DPC_WRITE(INTEGER(ADDR(TEMP)),0F0F6H,1); { SYSTEM_ERROR := 1; }
00000592  2                END;
00000596  2            OTHERWISE ; {no error trap}
00000596  2            END;
000005C8  2        IF STACK_AREA[0] <> 01234H THEN
000005D4  2            SYSTEM_MESSAGE(412,0,Error);
000005E4  2        IF IMD_STACK[0] <> 01234H THEN
000005F0  2            SYSTEM_MESSAGE(413,0,Error);
00000600  2        END;
00000604  2    END;
00000000  1
00000000  1    PROCEDURE STATIC_CONTROLLER;
0000060C  2    BEGIN
0000060C  2    KILL_DYNAMIC;
00000610  2    KILL_DISPLAY;
00000614  2    PARM_REC.CONFIG_PTR := INTEGER(ADDR(CONFIGURATION));
0000061C  2    DUMMY := 0001H;
00000622  2    PARM_REC.COMMAND_PTR := INTEGER(ADDR(DUMMY));
0000062A  2    PARM_REC.CMD_STACK_PTR := INTEGER(CMD_STACK);
00000630  2    {
00000630  2    OUTIT('C',INT(SHIFT(INTEGER(CMD_STACK),-16)),'H');
00000630  2    OUTIT('C',INT(INTEGER(CMD_STACK)),'H');
00000630  2    }
00000630  2    PARM_REC.EMA_STACK_PTR := INTEGER(NIL);
00000634  2    PARM_REC.DIS_STACK_PTR := INTEGER(NIL);
00000638  2    PARM_REC.ACTION := EXECUTE;
00000640  2    FORK_STATIC;
00000644  2    SLEEP_(MONITOR_CHAN,MONITOR_PRI);
00000656  2    READ_SIG_(DYNAMIC_ID,SIGNAL);
00000666  2    CASE SIGNAL OF
0000066E  2        HALTED, COMPLETED:
0000066E  2            BEGIN
0000066E  2            VALID_FOOTDC := TRUE;
00000674  2            DISPLAY_MASTER.LOCATION := 0;
00000678  2            CURRENT_DISPLAY := Measurement;
0000067E  2            WRITE_SOFTKEY_FORMAT;
00000682  2            DISPLAY_MASTER.CURRENT_FORMAT := CURRENT_FORMATS[MEAS_DISP_TYPE];
00000692  2            END;
00000696  2        NO_DATA:
00000696  2            BEGIN
00000696  2            VALID_FOOTDC := TRUE;
0000069C  2            CURRENT_DISPLAY := Setup;
000006A2  2            WRITE_SOFTKEY_FORMAT;
000006A6  2            DISPLAY_MASTER.CURRENT_FORMAT := CURRENT_FORMATS[MEAS_DISP_TYPE];
000006B6  2            END;
```

```
00000682  2      SEBI_CATAST:
000006B2  2          BEGIN
000006BA  2          VALID_FOOTDC := TRUE;
000006C0  2          DISPLAY_MASTER.LOCATION := 0;
000006C4  2          CURRENT_DISPLAY := Measurement;
000006CA  2          WRITE_SOFTKEY_FORMAT;
000006CE  2          DISPLAY_MASTER.CURRENT_FORMAT := CURRENT_FORMATS[MEAS_DISP_TYPE];
000006DE  2          END;
000006E2  2      CATASTROPHE:
000006E2  2          BEGIN
000006E2  2          CURRENT_DISPLAY := Setup;
000006E8  2          TEMP := 1;
000006EE  2          BPC_WRITE(INTEGER(ADDR(TEMP)),0F0F6H,1); { SYSTEM_ERROR := 1; }
00000704  2          END;
00000708  2      OTHERWISE ; {no error trap}
00000708  2      END;
0000073A  2  END;
00000000  1  .

****WARNING ?? - Symbol: LABEL_1, is duplicated in the asmb_sym file.
****WARNING ?? - Symbol: LABEL_1, is duplicated in the asmb_sym file.

End of compilation, number of errors=     0

00000000  1  "68000" PREPROCESS
00000000  1  $BASE_PAGE$
00000000  1  $WIDTH 120$
00000000  1
00000000  1  PROGRAM IO_UTLS_;
00000000  1
00000000  1  $EXTENSIONS ON$
00000000  1  $LIB_ABS_LONG$
00000000  1  $WARN OFF$
00000000  1
00000000  1  CONST
00000000  1      BUFF_SIZE = 120;
00000000  1
00000000  1  TYPE
00000000  1      SOD = SET OF 0..15;
00000000  1      INT = SIGNED_16;
00000000  1      PTR = ^ INTEGER;
00000000  1      WORD_PTR = ^ INT;
00000000  1      VECTOR0_7 = ARRAY[0..7] OF INT;
00000000  1      TNGRNAME = ARRAY[0..7] OF INT;
00000000  1      FILE_BUFFER = ARRAY[0..BUFF_SIZE] OF INT;
00000000  1      FILE_BUFFER_PTR = ^ FILE_BUFFER;
00000000  1      DOUBLE_WORD = RECORD
00000000  2                 MSW : INT;
00000000  2                 LSW : INT;
00000000  1                 END;
00000000  1  #INCLUDE ICMD_DATA:SODAMO
00000000  1  #INCLUDE ISPEC_DATA:SODAMO
00000000  1  #INCLUDE INCLUDE:KIP
00000000  1  #INCLUDE ICONFIG:SODAMO
00000000  1  #INCLUDE IDISPLAY:SODARCH
00000000  1  #INCLUDE IG_AREA:SODARU
00000000  1
00000000  1  VAR
00000000  1  $EXTVAR+$
00000000  1  $FAR$
00000000  1      printer_HP : VECTOR0_7;
00000000  1      LISTFILE_HEADER : VECTOR0_7;
00000000  1  $BASE_PAGE$
00000000  1      FILE_NAME : VECTOR0_7;
00000000  1      FILE_DISC : INT;
00000000  1      FILE_DCB : INT;
00000000  1      SEMANTIC_ERROR : INT;
00000000  1      MARK_PTR : PTR;
00000000  1      SPEC_STACK : SPECABLE_ARRAY_PTR;
00000000  1      G_AREA : INT;
00000000  1      SOFTKEY_FORMATS : ARRAY[0..2] OF INT;
00000000  1  {structures saved in the configuration}
00000000  1      BOARD_ID : INT;
00000000  1      PROTECTED : INT;
00000000  1      CODE_REV : INT;
```

```
00000000 1      SVDS_DATE : INTEGER;
00000000 1      CONFIGURATION : CONFIG_REC_TYPE;
00000000 1      DEFAULT_FILE : VECTORO_7;
00000000 1      DEFAULT_DISC : INT;
00000000 1      DEFAULT_PROC : VECTORO_7;
00000000 1      CURRENT_DISPLAY : INT;
00000000 1      MEASUREMENT_TYPE : INT;
00000000 1      MEAS_DISP_TYPE : INT;
00000000 1      SOURCE_FILE : VECTORO_7;
00000000 1      SOURCE_DISC : INT;
00000000 1      CURRENT_FORMATS : ARRAY[0..2] OF FMT_PTR;
00000000 1      DISPLAY_MASTER : DISPLAY_SPEC;
00000000 1      MEAS_SETUP : CMD_ARRAY;
00000000 1  $EXTVAR-$
00000000 1      FMGR_CODE : INT;
00000002 1      BUFFER : FILE_BUFFER_PTR;
00000006 1
00000006 1  $CALL_ABS_LONG ON$
00000000 1  PROCEDURE BPC_READ (ADDR_68K : PTR; ADDR_BPC : INT; LENGTH : INT); EXTERNAL;
00000000 1  PROCEDURE BPC_WRITE (ADDR_68K : PTR; ADDR_BPC : INT; LENGTH : INT); EXTERNAL;
00000000 1  PROCEDURE P_OPEN (VAR FNAME : VECTORO_7; FTYPE, DISC : INT;
00000000 2                   VAR DCB : INT; BUFSIZE : INT;
00000000 2                   VAR FMGR_CODE : INT); EXTERNAL;
00000000 1  PROCEDURE P_CREATE (VAR FNAME : VECTORO_7; FTYPE, DISC : INT;
00000000 2                     VAR DCB : INT; BUFSIZE : INT;
00000000 2                     VAR FMGR_CODE : INT); EXTERNAL;
00000000 1  PROCEDURE P_READ (VAR DCB : INT; VAR RBUFF : VECTORO_7; LENGTH : INT;
00000000 2                   VAR FMGR_CODE : INT); EXTERNAL;
00000000 1  PROCEDURE P_WRITE (VAR DCB : INT; VAR RBUFF : VECTORO_7;
00000000 2                    VAR FMGR_CODE : INT); EXTERNAL;
00000000 1  PROCEDURE P_POSITION (VAR DCB : INT; RECN : INT;
00000000 2                       VAR FMGR_CODE : INT); EXTERNAL;
00000000 1  PROCEDURE P_CLOSE (VAR DCB : INT; VAR FMGR_CODE : INT); EXTERNAL;
00000000 1  PROCEDURE P_FILE_ERR (VAR DCB : INT; FMGR_CODE : INT); EXTERNAL;
00000000 1  PROCEDURE DEFINE_IMB(ACTION : INT; REQUEST : INT; VAR RETURN_CODE : INT); EXTERNAL;
00000000 1  PROCEDURE P_CALENDAR(VAR STRING : INT); EXTERNAL;
00000000 1  PROCEDURE OUTIT(L:CHAR;V:INT;B:CHAR);EXTERNAL;
00000000 1  FUNCTION  NO_IMB : BOOLEAN; EXTERNAL;
00000000 1  PROCEDURE TURN_OFF_IMB; EXTERNAL;
00000000 1  PROCEDURE EMUL_STATUS(ASK : INT; VAR ERROR : INT); EXTERNAL;
00000006 1  $CALL_PC_SHORT ON$
00000000 1  PROCEDURE BUILD_CMD_STACK(ACTION : OP_CODES); EXTERNAL;
00000000 1  PROCEDURE GENERAL_MESSAGE(MESS_NUM : INT; MESSAGE_CODE : MESSAGE_TYPES); EXTERNAL;
00000000 1  PROCEDURE OUTPUT_LINE(VAR DISPLAY : DISPLAY_TYPE); EXTERNAL;
00000006 1
00000006 1  $GLOBPROC+$
00000000 1
00000000 1  PROCEDURE WRITE_SOFTKEY_FORMAT;
00000004 2  BEGIN
00000004 2  BPC_WRITE(PTR(ADDR(SOFTKEY_FORMATS[MEAS_DISP_TYPE])),G_AREA + BLANK_SOFT_OFF,1);
0000002A 2  END;
00000000 1
00000000 1  FUNCTION OPEN_LISTFILE(APPEND : BOOLEAN):INT;
00000002 2  VAR
00000002 2     TEMP : INT;
00000032 2  BEGIN
00000032 2  P_OPEN(FILE_NAME,5,FILE_DISC,FILE_DCB,1,FMGR_CODE);
00000056 2  IF FMGR_CODE = 3 THEN
00000062 2     IF FILE_NAME <> printer_HP THEN
0000007C 2          P_CREATE(FILE_NAME,5,FILE_DISC,FILE_DCB,1,FMGR_CODE);
000000A0 2  IF FMGR_CODE <> 0 THEN
000000A8 2     P_FILE_ERR(FILE_DCB,FMGR_CODE)
000000BC 2  ELSE BEGIN
000000BC 2     IF APPEND THEN
000000D4 2          IF FILE_NAME <> printer_HP THEN
000000DE 2               BEGIN
000000DE 2               P_POSITION(FILE_DCB,32767,FMGR_CODE);
000000F6 2               END;
000000F6 2     IF FMGR_CODE > 1 THEN
00000102 2          P_FILE_ERR(FILE_DCB,FMGR_CODE)
00000114 2     ELSE BEGIN
00000114 2          P_CALENDAR(LISTFILE_HEADER[2]);
00000122 2          P_WRITE(FILE_DCB,LISTFILE_HEADER,FMGR_CODE);
```

```
0000013C  2             IF FMGR_CODE <> 0 THEN
00000144  2                 P_FILE_ERR(FILE_DCB,FMGR_CODE)
00000154  2             END;
00000154  2         END.
00000154  2  OPEN_LISTFILE := FMGR_CODE;
0000015A  2  END;
00000000  1
00000000  1  PROCEDURE COPY_DISPLAY(VAR DISPLAY : DISPLAY_TYPE);
00000000  2  VAR
00000000  2      BPC_ADDR : INT;
00000002  2      LINE_PTR : PTR;
00000006  2      FMGR_CODE : INT;
00000008  2      I : INT;
00000168  2  BEGIN
00000168  2  LINE_PTR := PTR(INTEGER(DISPLAY.LINE) + 2),
00000174  2  BPC_ADDR := SCREEN_START;
0000017A  2  FOR I := 0 TO 18 DO
0000017E  2      BEGIN
0000017E  2      BPC_READ(LINE_PTR,BPC_ADDR,40);
00000192  2      OUTPUT_LINE(DISPLAY);
0000019E  2      BPC_ADDR := BPC_ADDR + 40;
000001A4  2      END;
000001B4  2  END;
00000000  1
00000000  1  PROCEDURE WRITE_HUNK(START : WORD_PTR; LENGTH : INT),
00000000  2  CONST
00000000  2      MAX_REC_LENGTH = 128;
00000000  2  VAR
00000000  2      WORDS_LEFT : INT;
00000002  2      WORDS_TO_GO : INT;
00000004  2      LOC : WORD_PTR;
00000008  2      I : INT;
000001BC  2  BEGIN
000001BC  2  WORDS_LEFT := LENGTH;
000001C2  2  LOC := START;
000001C8  2  WHILE (WORDS_LEFT > 0) AND (FMGR_CODE = 0) DO
000001E2  2      BEGIN
000001E2  2      IF WORDS_LEFT > MAX_REC_LENGTH THEN
000001EE  2          WORDS_TO_GO := MAX_REC_LENGTH
000001F8  2      ELSE
000001F8  2          WORDS_TO_GO := WORDS_LEFT;
000001FE  2      BUFFER^[0] := WORDS_TO_GO;
00000206  2      FOR I := 1 TO WORDS_TO_GO DO
0000021C  2          BEGIN
0000021C  2          BUFFER^[I] := LOC^;
0000022E  2          LOC := PTR(INTEGER(LOC) + 2)
00000238  2          END;
0000024A  2      WORDS_LEFT := WORDS_LEFT - WORDS_TO_GO;
00000252  2      P_WRITE (FILE_DCB,VECTOR0_7(BUFFER^),FMGR_CODE);
0000026C  2      END;
00000270  2  IF FMGR_CODE <> 0 THEN
00000278  2      P_FILE_ERR(FILE_DCB,FMGR_CODE);
00000288  2  END;
00000000  1
00000000  1  PROCEDURE READ_HUNK(START : WORD_PTR; LENGTH : INT);
00000000  2  CONST
00000000  2      MAX_REC_LENGTH = 128;
00000000  2  VAR
00000000  2      WORDS_LEFT : INT;
00000002  2      WORDS_TO_GO : INT;
00000004  2      LOC : WORD_PTR;
00000008  2      I : INT;
00000290  2  BEGIN
00000290  2  WORDS_LEFT := LENGTH;
00000296  2  LOC := START;
0000029C  2  WHILE (WORDS_LEFT > 0) AND (FMGR_CODE = 0) DO
000002B6  2      BEGIN
000002B6  2      IF WORDS_LEFT > MAX_REC_LENGTH THEN
000002C2  2          WORDS_TO_GO := MAX_REC_LENGTH
000002CC  2      ELSE
000002CC  2          WORDS_TO_GO := WORDS_LEFT;
000002D2  2      P_READ(FILE_DCB,VECTOR0_7(BUFFER^),WORDS_TO_GO,FMGR_CODE);
000002F0  2      FOR I := 1 TO WORDS_TO_GO DO
00000306  2          BEGIN
```

```
00000306  2           LOC^ := BUFFER^(I);
00000318  2           LOC := PTR(INTEGER(LOC) + 2)
00000322  2           END;
00000334  2       WORDS_LEFT := WORDS_LEFT - WORDS_TO_GO;
0000033C  2       END;
00000340  2   IF FMGR_CODE <> 0 THEN
00000348  2       P_FILE_ERR(FILE_DCB,FMGR_CODE);
00000358  2   END;
00000000  1
00000000  1   PROCEDURE SAVE_CONFIGURATION;
00000000  2   LABEL 1;
00000000  2   VAR
00000000  2       CON : CONFIGURE_PTR;
00000004  2       I : INT;
00000000  2
00000000  2   FUNCTION WRITE_IT : INT;
00000360  3   BEGIN
00000360  3   P_WRITE(FILE_DCB,VECTORO_7(CON.REC^),FMGR_CODE);
0000037E  3   WRITE_IT := FMGR_CODE;
00000384  3   END;
00000392  2
00000392  2   BEGIN
00000392  2   GENERAL_MESSAGE(52,Status);
0000039E  2   WITH CON DO BEGIN
000003A6  2   NEW(BUFFER);
000003B3  2   GENERIC := INTEGER(BUFFER);
000003C0  2   P_OPEN(FILE_NAME,8,FILE_DISC,FILE_DCB,2,FMGR_CODE);
000003E4  2   IF FMGR_CODE <> 0 THEN
000003EC  2       IF FMGR_CODE = 3 THEN
000003F8  2           BEGIN
000003F8  2           P_CREATE(FILE_NAME,8,FILE_DISC,FILE_DCB,2,FMGR_CODE);
0000041C  2           IF FMGR_CODE <> 0 THEN
00000424  2               GOTO 1; {error output at 1}
00000428  2           END
0000042C  2       ELSE BEGIN
0000042C  2           GOTO 1; {error output at 1}
00000430  2           END
00000434  2   ELSE BEGIN
00000434  2       P_READ(FILE_DCB.VECTORO_7(REC^),4,FMGR_CODE);
00000454  2       IF FMGR_CODE <> 0 THEN
0000045C  2           GOTO 1; {error output at 1}
00000460  2       IF HEADER^.PROTECTED = INT(TRUE) THEN
00000472  2           BEGIN
00000472  2           SEMANTIC_ERROR := 5;
00000478  2           GOTO 1; {error trapped}
0000047C  2           END;
0000047C  2       P_POSITION(FILE_DCB,1,FMGR_CODE);
00000494  2       IF FMGR_CODE <> 0 THEN
0000049C  2           GOTO 1; {error output at 1}
000004A0  2       END;
000004A0  2
000004A0  2   HEADER^.NUMBER := Header;
000004AC  2   HEADER^.LENGTH := 6;
000004B6  2   HEADER^.BOARD_ID := BOARD_ID;
000004C2  2   HEADER^.PROTECTED := PROTECTED;
000004CE  2   HEADER^.CODE_REV := CODE_REV;
000004DA  2   HEADER^.SUDS_DATE := SUDS_DATE;
000004E6  2   IF WRITE_IT <> 0 THEN GOTO 1; {error output at 1}
000004FA  2
000004FA  2   A_FILE^.NUMBER := Default_File;
00000506  2   A_FILE^.LENGTH := 10;
00000510  2   A_FILE^.FILE_NAME := DEFAULT_FILE;
00000526  2   A_FILE^.FILE_DISC := DEFAULT_DISC;
00000532  2   IF WRITE_IT <> 0 THEN GOTO 1; {error output at 1}
00000546  2
00000546  2   A_VECTOR^.NUMBER := Default_Proc;
00000552  2   A_VECTOR^.LENGTH := 9;
0000055C  2   A_VECTOR^.VALUE := DEFAULT_PROC;
00000572  2   IF WRITE_IT <> 0 THEN GOTO 1; {error output at 1}
00000586  2
00000586  2   A_INT^.NUMBER := Measurement_Type;
00000592  2   A_INT^.LENGTH := 2;
0000059C  2   A_INT^.VALUE := MEASUREMENT_TYPE;
000005A8  2   IF WRITE_IT <> 0 THEN GOTO 1; {error output at 1}
```

```
000005BC  2
000005BC  2  (**********
000005BC  2  A_INT^.NUMBER := Meas_Disp_Type;
000005BC  2  A_INT^.LENGTH := 2;
000005BC  2  A_INT^.VALUE := MEAS_DISP_TYPE;
000005BC  2  IF WRITE_IT <> 0 THEN GOTO 1; (error output at 1}
000005BC  2  **********)
000005BC  2
000005BC  2  A_FILE^.NUMBER := Source_File;
000005C8  2  A_FILE^.LENGTH := 10;
000005D2  2  A_FILE^.FILE_NAME := SOURCE_FILE;
000005E8  2  A_FILE^.FILE_DISC := SOURCE_DISC;
000005F4  2  IF WRITE_IT <> 0 THEN GOTO 1; (error output at 1}
00000608  2
00000608  2  A_FILE^.NUMBER := Emul_Cmd_File;
00000614  2  A_FILE^.LENGTH := 10;
0000061E  2  A_FILE^.FILE_NAME := CONFIGURATION.EMUL_FILE;
00000634  2  A_FILE^.FILE_DISC := CONFIGURATION.EMUL_DISC;
00000640  2  IF WRITE_IT <> 0 THEN GOTO 1; (error output at 1}
00000654  2
00000654  2  A_CONFIG^.NUMBER := Configuration;
00000660  2  (A_CONFIG^.LENGTH := 29;        }
00000660  2  A_CONFIG^.LENGTH := INT(INTEGER(ADDR(CONFIGURATION.EMUL_DISC)) - INTEGER(ADDR(CONFIGURATION))) / 2 + 2;
0000067C  2  A_CONFIG^.VALUE := CONFIGURATION;
00000692  2  IF WRITE_IT <> 0 THEN GOTO 1; (error output at 1}
000006A6  2
000006A6  2  A_DISPLAY^.NUMBER := Display_Master;
000006B2  2  A_DISPLAY^.LENGTH := 20;
000006BC  2  A_DISPLAY^.VALUE := DISPLAY_MASTER;
000006D2  2  IF WRITE_IT <> 0 THEN GOTO 1; (error output at 1}
000006E6  2
000006E6  2  A_FORMAT^.NUMBER := Current_Formats;
000006F2  2  A_FORMAT^.LENGTH := 22;
000006FC  2  FOR I := 0 TO 12 DO
00000700  2      BEGIN
00000700  2      IF INTEGER(CURRENT_FORMATS[I]) <> 0 THEN
00000712  2          BEGIN
00000712  2          A_FORMAT^.VALUE := I;
0000071E  2          A_FORMAT^.FORMAT := CURRENT_FORMATS[I]^;
0000073E  2          IF WRITE_IT <> 0 THEN GOTO 1; (error output at 1}
00000752  2          END;
00000752  2      END.
00000762  2
00000762  2  FOR I := 0 TO NUM_OF_CMD_TYPES DO
00000766  2      BEGIN
00000766  2      A_TAG^.NUMBER := Meas_Setup;
00000772  2      A_TAG^.LENGTH := 2;
0000077C  2      A_TAG^.SUB_NUM := I;
00000788  2      IF WRITE_IT <> 0 THEN GOTO 1; (error output at 1}
0000079C  2      WRITE_HUNK(WORD_PTR(MEAS_SETUP[CMD_TYPES(I)].SPEC),SPECABLE_SIZE+1);
000007CE  2      END;
000007CE  2
000007CE  2  1 :
000007CE  2  IF FMGR_CODE <> 0 THEN
000007D6  2      P_FILE_ERR(FILE_DCB,FMGR_CODE);
000007E6  2  P_CLOSE(FILE_DCB,FMGR_CODE);
000007F6  2  DISPOSE(BUFFER);
00000808  2  END;
00000808  2  GENERAL_MESSAGE(53,Status);
00000814  2  END;
00000000  1
00000000  1  PROCEDURE LOAD_CONFIGURATION;
00000000  2  LABEL 1;
00000000  2  VAR
00000000  2      CON : CONFIGURE_PTR;
00000004  2      TEMP_MARK_PTR : PTR;
00000008  2      TEMP : INT;
0000000A  2      RETURN_CODE : INT;
00000000  2
00000000  2  PROCEDURE SETUP_AN_IMB_LINE(ACTION : INT; REQUEST : IMB_LINES; VAR RETURN_CODE : INT);
0000081C  3  BEGIN
0000081C  3  CASE REQUEST OF
00000826  3      TRIGGER_ENABLE : DEFINE_IMB(ACTION,+2,RETURN_CODE);
00000840  3      STORAGE_ENABLE : DEFINE_IMB(ACTION,+3,RETURN_CODE);
```

```
0000085A  3        TRIGGER         : DEFINE_IMB(ACTION,+4,RETURN_CODE);
00000874  3        OTHERWISE ; (no error trap)
00000874  3        END;
00000896  3   END;
000008A2  2
000008A2  2   BEGIN
000008A2  2   WITH CON DO BEGIN
000008AA  2   TEMP_MARK_PTR := MARK_PTR;
000008B0  2   NEW(BUFFER);
000008C2  2   GENERIC := INTEGER(BUFFER);
000008CA  2   P_OPEN(FILE_NAME,8,FILE_DISC,FILE_DCB,2,FMGR_CODE);
000008EE  2   IF FMGR_CODE <> 0 THEN
000008F6  2       GOTO 1; (error output at 1)
000008FA  2   P_READ(FILE_DCB,VECTORO_7(REC^),BUFF_SIZE,FMGR_CODE);
0000091A  2   IF FMGR_CODE <> 0 THEN
00000922  2       GOTO 1; (error output at 1)
00000926  2   IF HEADER^.BOARD_ID <> 0104H THEN
00000932  2           BEGIN
00000933  2           SEMANTIC_ERROR := 6;
0000093E  2           GOTO 1; (error trapped)
00000942  2           END;
00000942  2   P_POSITION(FILE_DCB,1,FMGR_CODE);
0000095A  2   IF FMGR_CODE <> 0 THEN
00000962  2       GOTO 1; (error output at 1)
00000966  2
00000966  2   WHILE (FMGR_CODE <> 1) AND (SEMANTIC_ERROR = 0) DO
00000984  2       BEGIN
00000984  2       CASE A_TAG^.NUMBER OF
00000994  2            Header : BEGIN
00000994  2                 IF HEADER^.CODE_REV < 023CH THEN
000009A6  2                      GENERAL_MESSAGE(58,Error)
000009B8  2                 ELSE BEGIN
000009B6  2                      BOARD_ID := HEADER^.BOARD_ID;
000009C4  2                      PROTECTED := HEADER^.PROTECTED;
000009CC  2                      CODE_REV := HEADER^.CODE_REV;
000009D4  2                      SUDS_DATE := HEADER^.SUDS_DATE;
000009DC  2                      END;
000009DC  2                 END;
000009E0  2            Default_File : BEGIN
000009E0  2                 DEFAULT_FILE := A_FILE^.FILE_NAME;
000009F6  2                 DEFAULT_DISC := A_FILE^.FILE_DISC;
000009FE  2                 END;
00000A02  2            Default_Proc : BEGIN
00000A02  2                 DEFAULT_PROC := A_VECTOR^.VALUE;
00000A18  2                 END;
00000A1C  2            Measurement_Type : BEGIN
00000A1C  2                 MEASUREMENT_TYPE := A_INT^.VALUE;
00000A28  2                 END;
00000A2C  2            Meas_Disp_Type : BEGIN
00000A2C  2                 (**********
00000A2C  2                 MEAS_DISP_TYPE := A_INT^.VALUE;
00000A2C  2                 **********)
00000A2C  2                 END;
00000A30  2            Source_File : BEGIN
00000A30  2                 SOURCE_FILE := A_FILE^.FILE_NAME;
00000A46  2                 SOURCE_DISC := A_FILE^.FILE_DISC;
00000A4E  2                 END;
00000A52  2            Emul_Cmd_File : BEGIN
00000A52  2               • (done by Configuration)
00000A52  2                 END;
00000A56  2            Configuration : BEGIN
00000A56  2                 TURN_OFF_IMB;
00000A5C  2                 CONFIGURATION := A_CONFIG^.VALUE;
00000A72  2                 SETUP_AN_IMB_LINE(1,CONFIGURATION.ENABLE_IMB.RECEIVE,RETURN_CODE);
00000A8C  2                 SETUP_AN_IMB_LINE(1,CONFIGURATION.DISABLE_IMB.RECEIVE,RETURN_CODE);
00000AA6  2                 SETUP_AN_IMB_LINE(1,CONFIGURATION.ENABLE_IMB.DRIVE,RETURN_CODE);
00000AC0  2                 IF RETURN_CODE < 0 THEN
00000AC3  2                      GENERAL_MESSAGE(40,Warning);
00000AD6  2                SETUP_AN_IMB_LINE(1,CONFIGURATION.DISABLE_IMB.DRIVE,RETURN_CODE);
00000AF0  2                IF RETURN_CODE < 0 THEN
00000AF8  2                      GENERAL_MESSAGE(40,Warning);
00000B06  2                IF NOT NO_IMB THEN
00000B10  2                      DEFINE_IMB(1,+1,RETURN_CODE);
00000B24  2                IF CONFIGURATION.REAL_TIME THEN
```

```
00000B2C  2                    TEMP := 1
00000B36  2                 ELSE
00000B36  2                    TEMP := 0;
00000B3A  2                 SPC_WRITE(PTR(ADDR(TEMP)),G_AREA + REAL_TIME_OFF,1);
00000B56  2                 SPC_WRITE(PTR(ADDR(CONFIGURATION.ABS_FILE)),G_AREA + ABS_FILE_OFF,8);
00000B72  2                 SPC_WRITE(PTR(ADDR(CONFIGURATION.ABS_DISC)),G_AREA + ABS_DISC_OFF,1);
00000B8E  2                 END;
00000B92  2              Display_Master : BEGIN
00000B92  2                 DISPLAY_MASTER := A_DISPLAY^.VALUE;
00000BA8  2                 END;
00000BAC  2              Current_Formats : BEGIN
00000BAC  2                 CURRENT_FORMATS[A_FORMAT^.VALUE]^ := A_FORMAT^.FORMAT;
00000BCE  2                 END;
00000BD2  2              Meas_Setup : BEGIN
00000BD2  2                 TEMP := A_TAG^.SUB_NUM;
00000BDE  2                 MARK(MARK_PTR);
00000BEA  2                 NEW(SPEC_STACK);
00000BFC  2                 READ_HUNK(WORD_PTR(SPEC_STACK),SPECABLE_SIZE+1);
00000C0A  2                 CASE CMD_TYPES(TEMP) OF
00000C16  2                    EXECUTION :
00000C16  2                       BUILD_CMD_STACK(AT_RUN);
00000C24  2                    MEASUREMENT :
00000C24  2                       BUILD_CMD_STACK(OP_CODES(MEASUREMENT_TYPE));
00000C34  2                    START_ON :
00000C34  2                       BUILD_CMD_STACK(CD_ENA);
00000C42  2                    STOP_ON :
00000C42  2                       BUILD_CMD_STACK(CD_DIS);
00000C50  2                    OTHERWISE   {no error}
00000C50  2                       RELEASE(MARK_PTR);
00000C5C  2                    END;
00000C82  2                 END;
00000C86  2              OTHERWISE BEGIN
00000C86  2                 SEMANTIC_ERROR := 58;
00000C8C  2                 GOTO 1;
00000C90  2                 END;
00000C90  2              END;
00000CB4  2           P_READ(FILE_DCB,VECTORO_7(REC^),BUFF_SIZE,FMGR_CODE);
00000CF4  2           IF FMGR_CODE <> 0 THEN
00000CFC  2              IF FMGR_CODE <> 1 THEN
00000D08  2                 GOTO 1; {error output at 1}
00000D0C  2           END;
00000D10  2
00000D10  2        IF FMGR_CODE = 1 THEN
00000D1C  2           FMGR_CODE := 0;
00000D20  2        FMUL_STATUS(128,RETURN_CODE);
00000D30  2        IF RETURN_CODE = 5 THEN
00000D3C  2           GENERAL_MESSAGE(64,Warning);
00000D4A  2
00000D4A  2        1 :
00000D4A  2        IF FMGR_CODE <> 0 THEN
00000D52  2           P_FILE_ERR(FILE_DCB,FMGR_CODE);
00000D62  2        P_CLOSE(FILE_DCB,FMGR_CODE);
00000D72  2        DISPOSE(BUFFER);
00000D84  2        MARK_PTR := TEMP_MARK_PTR;
00000D9A  2        END;
00000D9A  2        END;
00000000  1

***WARNING ?? - Symbol: LABEL_1, is duplicated in the asmb_syn file.

End of compilation, number of errors=    0

00000000  1  "68000" PREPROCESS
00000000  1  $BASE_PAGES
00000000  1  $WIDTH 120$
00000000  1
00000000  1  PROGRAM MISC_UTL_;
00000000  1
00000000  1  $EXTENSIONS ON$
00000000  1  $LIB_ABS_LONG$
00000000  1  $WARN OFF$
00000000  1
00000000  1  CONST
```

```
00000000 1      ERROR_CODE  = 0E000H;
00000000 1      STATUS_CODE = 0600OH,
00000000 1
00000000 1  TYPE
00000000 1      INT = SIGNED_16.
00000000 1      PTR = ^ INTEGER;
00000000 1      WORD_PTR = ^ INT;
00000000 1      BYTE_PTR = ^ UNSIGNED_8;
00000000 1      VECTORO_7 = ARRAY[0..7] OF INT;
00000000 1      FMGRNAME = ARRAY[0..7] OF INT;
00000000 1      DOUBLE_WORD = RECORD
00000000 2                  MSW : INT;
00000000 2                  LSW : INT;
00000000 1                  END;
00000000 1      COMPLEX_TYPE = RECORD
00000000 2                  VALUE : DOUBLE_WORD;
00000000 2                  MASK : DOUBLE_WORD;
00000000 1                  END;
00000000 1  #INCLUDE ICMD_DATA:SODAMON
00000000 1  #INCLUDE ISPEC_DATA:SODAMON
00000000 1  #INCLUDE ICHILDREN:SODAMON
00000000 1  #INCLUDE IDISPLAY:SODAMON
00000000 1  #INCLUDE INCLUDE:KIP
00000000 1
00000000 1  VAR
00000000 1  $EXTVAR+$
00000000 1  $FAR$
00000000 1      SYNT_ERRS : ARRAY[0..100] OF BYTE_PTR;
00000000 1  $BASE_PAGE$
00000000 1      SEMANTIC_ERROR : INT;
00000000 1      SEMANTIC_WARNING : BOOLEAN;
00000000 1      SPEC_STACK : SPECABLE_ARRAY_PTR;
00000000 1      SPEC_STACK_PTR : SPECABLE_TYPE_PTR;
00000000 1      DISPLAY_MASTER : DISPLAY_SPEC;
00000000 1      CURRENT_DISPLAY : INT;
00000000 1      DISPLAY : DISPLAY_TYPE;
00000000 1      SOURCE_FILE : VECTORO_7;
00000000 1      SOURCE_DISC : INT;
00000000 1      SOURCE_DCB : INT;
00000000 1      SOURCE_UP : INT;
00000000 1      DISPLAY_ID : INT;
00000000 1  $EXTVAR-$
00000000 1      DUMMY : INT;
00000002 1
00000002 1  $CALL_ABS_LONG ON$
00000000 1  PROCEDURE P_CLOSE (VAR DCB : INT; VAR FMGR_CODE : INT); EXTERNAL;
00000000 1  PROCEDURE P_MESSAGE (MESS_PTR : BYTE_PTR; CODE : INT); EXTERNAL;
00000000 1  PROCEDURE OUTIT(L :  CHAR; V : INT; B : CHAR); EXTERNAL;
00000000 1  PROCEDURE WAKEUP_ (CHAN : INTEGER); EXTERNAL,
00000000 1  PROCEDURE COPYBYTES(SOURCE, DEST : BYTE_PTR; LENGTH : INT); EXTERNAL;
00000000 1  PROCEDURE READ_SIG_(ID : INT; VAR SIGNAL : INTEGER); EXTERNAL;
00000002 1  $CALL_PC_SHORT ON$
00000000 1  PROCEDURE FORMAT (SIGNED:BOOLEAN; SOURCE:BYTE_PTR; SOURCESIZE:INT;
00000000 2                     DEST:BYTE_PTR; VAR DESTSIZE:INT; BASE:INT; JUSTIFY:INT); EXTERNAL;
00000000 1  PROCEDURE SHOW_SETUP(VAR DISPLAY : DISPLAY_TYPE); EXTERNAL;
00000000 1  PROCEDURE FORMAT_SYMBOL(VAR DISPLAY : DISPLAY_TYPE); EXTERNAL;
00000000 1  PROCEDURE SHOW_SOURCE(VAR DISPLAY : DISPLAY_TYPE); EXTERNAL;
00000000 1  PROCEDURE FORMAT_STACK(VAR DISPLAY : DISPLAY_TYPE); EXTERNAL;
00000000 1  PROCEDURE COPY_DISPLAY(VAR DISPLAY : DISPLAY_TYPE); EXTERNAL;
00000000 1  FUNCTION  OPEN_LISTFILE(APPEND : BOOLEAN) : INT; EXTERNAL;
00000000 1  PROCEDURE FMT_FILE(VAR DISPLAY : DISPLAY_TYPE;
00000000 2                     VAR NAME : VECTORO_7; DISC : INT;
00000000 2                     LAST_COL : INT; SPACE : BOOLEAN); EXTERNAL;
00000000 1  PROCEDURE FORK_DISPLAY; EXTERNAL;
00000000 1  PROCEDURE WAIT_FOR_DISPLAY; EXTERNAL;
00000000 1
00000000 1  $GLOBPROC+$
00000000 1
00000000 1  PROCEDURE FILE_MESSAGE(MESS_NUM : INT; FILE_NAME : VECTORO_7; FILE_DISC : INT;
00000000 2                        MESSAGE_CODE : MESSAGE_TYPES);
00000000 2  VAR
00000000 2      I : INT;
00000002 2      MESS_PTR : BYTE_PTR;
00000006 2      TEMP_PTR : WORD_PTR;
```

```
00000008  2      TEMP_DISPLAY : DISPLAY_TYPE;
00000014  2  BEGIN
00000014  2  IF SEMANTIC_ERROR = 0 THEN
0000001C  2      BEGIN
0000001C  2      MESS_PTR := BYTE_PTR(SYMT_ERRS[MESS_NUM]^);
00000030  2      TEMP_PTR := WORD_PTR(MESS_PTR);
00000036  2      TEMP_DISPLAY.LINE := LINE_BUFFER_PTR(BYTE_PTR(INTEGER(TEMP_PTR) + TEMP_PTR^ * 2 + 2 - 30));
00000052  2      FOR I := 0 TO 18 DO
00000056  2          TEMP_DISPLAY.LINE^[I] := 20H;
00000076  2      TEMP_DISPLAY.COLUMN := 0;
0000007A  2      FMT_FILE(TEMP_DISPLAY,FILE_NAME,FILE_DISC,LINE_SIZE,FALSE);
00000096  2      CASE MESSAGE_CODE OF
000000A0  2          Status: BEGIN
000000A0  2              IF NOT SEMANTIC_WARNING THEN
000000A8  2                  P_MESSAGE(MESS_PTR,STATUS_CODE);
000000B8  2              END;
000000BC  2          Warning: BEGIN
000000BC  2              P_MESSAGE(MESS_PTR,STATUS_CODE);
000000CC  2              SEMANTIC_WARNING := TRUE;
000000D2  2              END;
000000D6  2          Error: BEGIN
000000D6  2              P_MESSAGE(MESS_PTR,ERROR_CODE);
000000E6  2              SEMANTIC_ERROR := -1;
000000EC  2              END;
000000F0  2          OTHERWISE ; {no error trap}
000000F0  2          END;
00000114  2      END;
00000114  2  END;
00000000  1
00000000  1  PROCEDURE SYMBOL_MESSAGE(MESS_NUM : INT; VAR IDENT : VECTOR0_7; MESSAGE_CODE : MESSAGE_TYPES);
00000000  2  VAR
00000000  2      I : INT;
00000002  2      MESS_PTR : BYTE_PTR;
00000006  2      TEMP_PTR : WORD_PTR;
0000000A  2      SRC_PTR : BYTE_PTR;
0000000E  2      DST_PTR : BYTE_PTR;
00000012  2      BLANK : VECTOR0_7;
00000022  2      LENGTH : INT;
0000011C  2  BEGIN
0000011C  2  IF SEMANTIC_ERROR = 0 THEN
00000124  2      BEGIN
00000124  2      MESS_PTR := BYTE_PTR(SYMT_ERRS[MESS_NUM]^);
00000138  2      TEMP_PTR := WORD_PTR(MESS_PTR);
0000013E  2      DST_PTR := BYTE_PTR(INTEGER(TEMP_PTR) + TEMP_PTR^ * 2 + 2 - 15);
0000015A  2      FOR I := 0 TO 7 DO
0000015E  2          BLANK[I] := 2020H;
0000017E  2      SRC_PTR := BYTE_PTR(ADDR(BLANK));
00000186  2      LENGTH := 15;
0000018C  2      COPYBYTES(SRC_PTR,DST_PTR,LENGTH);
000001A4  2      SRC_PTR := BYTE_PTR(INTEGER(ADDR(IDENT)) + 1);
000001B0  2      LENGTH := SHIFT(IDENT[0],-13) * 2 + 1;
000001C6  2      COPYBYTES(SRC_PTR,DST_PTR,LENGTH);
000001DA  2      CASE MESSAGE_CODE OF
000001E4  2          Status: BEGIN
000001E4  2              IF NOT SEMANTIC_WARNING THEN
000001EC  2                  P_MESSAGE(MESS_PTR,STATUS_CODE);
000001FC  2              END;
00000200  2          Warning: BEGIN
00000200  2              P_MESSAGE(MESS_PTR,STATUS_CODE);
00000210  2              SEMANTIC_WARNING := TRUE;
00000216  2              END;
0000021A  2          Error: BEGIN
0000021A  2              P_MESSAGE(MESS_PTR,ERROR_CODE);
0000022A  2              SEMANTIC_ERROR := -1;
00000230  2              END;
00000234  2          OTHERWISE ; {no error trap}
00000234  2          END;
00000258  2      END;
00000258  2  END;
00000000  1
00000000  1  PROCEDURE LINE_MESSAGE(MESS_NUM : INT; LINE : INT; MESSAGE_CODE : MESSAGE_TYPES);
00000000  2  VAR
00000000  2      MESS_PTR : BYTE_PTR;
00000004  2      TEMP_PTR : WORD_PTR;
```

```
00000008  2      SRC_PTR : BYTE_PTR;
0000000C  2      DST_PTR : BYTE_PTR;
00000010  2      LENGTH : INT;
00000260  2  BEGIN
00000260  2  IF SEMANTIC_ERROR = 0 THEN
00000268  2      BEGIN
00000268  2      MESS_PTR := BYTE_PTR(SYNT_ERRS[MESS_NUM]^);
0000027C  2      TEMP_PTR := WORD_PTR(MESS_PTR);
00000282  2      DST_PTR := BYTE_PTR(INTEGER(TEMP_PTR) + TEMP_PTR^ * 2 + 2 - 5);
0000029A  2      SRC_PTR := BYTE_PTR(ADDR(LINE));
000002A2  2      LENGTH := 5;
000002A8  2      FORMAT(FALSE,SRC_PTR,2,DST_PTR,LENGTH,10,-1);
000002CA  2      CASE MESSAGE_CODE OF
000002D4  2          Status: BEGIN
000002D4  2              IF NOT SEMANTIC_WARNING THEN
000002DC  2                  P_MESSAGE(MESS_PTR,STATUS_CODE);
000002EC  2              END;
000002F0  2          Warning: BEGIN
000002F0  2              P_MESSAGE(MESS_PTR,STATUS_CODE);
00000300  2              SEMANTIC_WARNING := TRUE;
00000306  2              END;
0000030A  2          Error: BEGIN
0000030A  2              P_MESSAGE(MESS_PTR,ERROR_CODE);
0000031A  2              SEMANTIC_ERROR := -1;
00000320  2              END;
00000324  2          OTHERWISE ; {no error trap}
00000324  2          END;
00000348  2      END;
00000348  2  END;
00000000  1
00000000  1  PROCEDURE SYSTEM_MESSAGE(MESS_NUM, MESS_CODE : INT; MESSAGE_CODE : MESSAGE_TYPES);
00000000  2  VAR
00000000  2      MESS_PTR : BYTE_PTR;
00000004  2      TEMP_PTR : WORD_PTR;
00000008  2      SRC_PTR : BYTE_PTR;
0000000C  2      DST_PTR : BYTE_PTR;
00000010  2      LENGTH : INT;
00000350  2  BEGIN
00000350  2  IF SEMANTIC_ERROR = 0 THEN
00000358  2      BEGIN
00000358  2      MESS_PTR := BYTE_PTR(SYNT_ERRS[0]^);
00000362  2      TEMP_PTR := WORD_PTR(MESS_PTR);
00000368  2      DST_PTR := BYTE_PTR(INTEGER(TEMP_PTR) + TEMP_PTR^ * 2 + 2 - 20);
00000384  2      SRC_PTR := BYTE_PTR(ADDR(MESS_NUM));
0000038C  2      LENGTH := 5;
00000392  2      FORMAT(FALSE,SRC_PTR,2,DST_PTR,LENGTH,10,-1);
000003B4  2      DST_PTR := BYTE_PTR(INTEGER(TEMP_PTR) + TEMP_PTR^ * 2 + 2 - 6);
000003CC  2      SRC_PTR := BYTE_PTR(ADDR(MESS_CODE));
000003D4  2      LENGTH := 6;
000003DA  2      FORMAT(FALSE,SRC_PTR,2,DST_PTR,LENGTH,10,-1);
000003FC  2      CASE MESSAGE_CODE OF
00000406  2          Status: BEGIN
00000406  2              IF NOT SEMANTIC_WARNING THEN
0000040E  2                  P_MESSAGE(MESS_PTR,STATUS_CODE);
0000041E  2              END;
00000422  2          Warning: BEGIN
00000422  2              P_MESSAGE(MESS_PTR,STATUS_CODE);
00000432  2              SEMANTIC_WARNING := TRUE;
00000438  2              END;
0000043C  2          Error: BEGIN
0000043C  2              P_MESSAGE(MESS_PTR,ERROR_CODE);
0000044C  2              SEMANTIC_ERROR := -1;
00000452  2              END;
00000456  2          OTHERWISE ; {no error trap}
00000456  2          END;
0000047A  2      END;
0000047A  2  END;
00000000  1
00000000  1  PROCEDURE GENERAL_MESSAGE(MESS_NUM : INT; MESSAGE_CODE : MESSAGE_TYPES);
00000000  2  VAR
00000000  2      MESS_PTR : BYTE_PTR;
00000482  2  BEGIN
00000482  2  IF SEMANTIC_ERROR = 0 THEN
0000048A  2      BEGIN
```

```
00000408  2      MESS_PTR := BYTE_PTR(SYNT_ERRS[MESS_NUM]^);
0000049E  2      CASE MESSAGE_CODE OF
000004A8  2          Status: BEGIN
000004A8  2              IF NOT SEMANTIC_WARNING THEN
000004B0  2                  P_MESSAGE(MESS_PTR,STATUS_CODE);
000004C0  2              END;
000004C0  2          Warning: BEGIN
000004C0  2              P_MESSAGE(MESS_PTR,STATUS_CODE);
000004D4  2              SEMANTIC_WARNING := TRUE;
000004DA  2              END;
000004DE  2          Error: BEGIN
000004DE  2              P_MESSAGE(MESS_PTR,ERROR_CODE);
000004EE  2              SEMANTIC_ERROR := -1;
000004F4  2              END;
000004F8  2          OTHERWISE ; {no error trap}
000004F8  2          END;
0000051C  2      END;
0000051C  2  END;
00000000  1
00000000  1  FUNCTION DB_ERROR(ERROR : INT) : BOOLEAN;
00000524  2  BEGIN
00000524  2  DB_ERROR := TRUE;
0000052A  2  IF SEMANTIC_ERROR = 0 THEN
00000532  2      CASE ERROR OF
0000053C  2          0:   DB_ERROR := FALSE;             {no error}
00000544  2          10 : SEMANTIC_ERROR := 2;
0000054E  2          11 : ;                              {out of space}
00000552  2          12 : ;                              {not found}
00000556  2          13 : ;                              {:comp_db file not found}
0000055A  2          15 : SEMANTIC_ERROR := 46;          (invalid type)
00000564  2          OTHERWISE SEMANTIC_ERROR := -1;
0000056A  2              { 1,2,3,4,5,6,7,8,9             FMGR errors            }
0000056A  2              { 20,21,22,23,24,25,26,27       message printed by db }
0000056A  2              { 28,29,30,31,32,33,34,35,36    spider errors          }
0000056A  2          END;
000005A8  2  END;
00000000  1
00000000  1  PROCEDURE DISPLAY_SOMETHING(THIS_DISPLAY : INT; COPY_FLAG : BOOLEAN);
00000000  2  VAR
00000000  2      SIGNAL : INTEGER;
000005B6  2  BEGIN
000005B6  2  { WAIT_FOR_DISPLAY;             }
000005B6  2  IF THIS_DISPLAY = -1 THEN
000005C2  2      THIS_DISPLAY := CURRENT_DISPLAY;
000005C8  2  DISPLAY.COPY_FLAG := COPY_FLAG;
000005CE  2  IF COPY_FLAG THEN
000005D6  2      GENERAL_MESSAGE(50,Status)
000005E6  2  ELSE BEGIN
000005E6  2      IF THIS_DISPLAY <> DISPLAY.LAST_DISPLAY THEN
000005F2  2          BEGIN
000005F2  2          DISPLAY.HORIZONTAL := 1;
000005F8  2          IF SOURCE_UP = 1 THEN
00000604  2              BEGIN
00000604  2              P_CLOSE(SOURCE_DCB,DUMMY);
00000614  2              SOURCE_UP := 0;
00000618  2              END;
00000618  2          END;
00000618  2      IF DISPLAY.HORIZONTAL + 15 > DISPLAY.MAX_LINE THEN
00000628  2          DISPLAY.HORIZONTAL := DISPLAY.MAX_LINE - 15;
00000634  2      IF DISPLAY.HORIZONTAL < 1 THEN
00000640  2          DISPLAY.HORIZONTAL := 1;
00000646  2      IF DISPLAY.VERTICAL + 80 > SOURCE_SIZE THEN
00000656  2          DISPLAY.VERTICAL := SOURCE_SIZE - 80,
0000065C  2      IF DISPLAY VERTICAL < 0 THEN
00000664  2          DISPLAY.VERTICAL := 0;
00000668  2      END;
00000668  2  DISPLAY.ROW := -1;
0000066E  2  CASE THIS_DISPLAY OF
00000678  2      Display : BEGIN
00000678  2          COPY_DISPLAY(DISPLAY);
00000682  2          END;
00000686  2      Setup : BEGIN
00000686  2          SHOW_SETUP(DISPLAY);
00000690  2          END;
```

```
00000694  2      Measurement : BEGIN
00000694  2          IF (SEMANTIC_ERROR = 0) AND (NOT SEMANTIC_WARNING) THEN
000006AC  2              BEGIN
000006AC  2              READ_SIG_(DISPLAY_ID.SIGNAL);
000006BC  2              CASE SIGNAL OF
000006C4  2                  CHILD_ASLEEP : BEGIN
000006C4  2                      DISPLAY_MASTER.CMD := DISPLAY.COMMAND;
000006CA  2                      WAKEUP_(DISPLAY_CHANL);
000006D8  2                      END;
000006DC  2                  CHILD_DEAD : BEGIN
000006DC  2                      FORK_DISPLAY;
000006E0  2                      END;
000006E4  2                  CHILD_AWAKE : BEGIN
000006E4  2                      WAIT_FOR_DISPLAY;
000006E8  2                      DISPLAY_MASTER.CMD := DISPLAY.COMMAND,
000006EE  2                      WAKEUP_(DISPLAY_CHANL);
000006FC  2                      END;
00000700  2                  OTHERWISE SYSTEM_MESSAGE(122,INT(SIGNAL),Error);
00000714  2                  END;
00000730  2              IF COPY_FLAG THEN
00000740  2                  WAIT_FOR_DISPLAY;
00000744  2              END;
00000744  2          END;
00000748  2      Source : BEGIN
00000748  2          FILE_MESSAGE(23,SOURCE_FILE,SOURCE_DISC,Status);
00000760  2          SHOW_SOURCE(DISPLAY);
0000076A  2          END;
0000076E  2      Debug : BEGIN
0000076E  2          FORMAT_STACK(DISPLAY);
00000778  2          END;
0000077C  2      Symbol : BEGIN
0000077C  2          FORMAT_SYMBOL(DISPLAY);
00000786  2          END;
0000078A  2      OTHERWISE SYSTEM_MESSAGE(121,THIS_DISPLAY,Error);
0000079C  2      END;
000007C6  2  IF COPY_FLAG THEN
000007CE  2      BEGIN
000007CE  2      DISPLAY.HOLD_DISPLAY := TRUE;            {no need to update the current display}
000007D4  2      IF THIS_DISPLAY <> Measurement THEN
000007E0  2          GENERAL_MESSAGE(51,Status);
000007EC  2      END
000007F0  2  ELSE
000007F0  2      DISPLAY.LAST_DISPLAY := THIS_DISPLAY;
000007F6  2  DISPLAY.COMMAND := NO_ACTION;
000007FA  2  END;
00000000  1
00000000  1  PROCEDURE INCREMENT_STACK(VAR STACK : SPECABLE_TYPE_PTR);
00000802  2  BEGIN
00000802  2  STACK := SPECABLE_TYPE_PTR(INTEGER(STACK) + STACK^.LENGTH);
0000081A  2  END;
00000000  1
00000000  1  PROCEDURE ADD_TO_STACK(VAR STACK :SPECABLE_TYPE_PTR; OP_CODE : INT; S_VAL : INT;
00000000  2                       L_VAL : INTEGER, VAR IDENT : VECTOR0_7);
00000822  2  BEGIN
00000822  2  STACK^.OP_CODE := OP_CODE,
0000082C  2  CASE OP_CODE OF
00000836  2      SPEC_END,                   {end of spec stack}
00000836  2      SPEC_VEND : BEGIN           {end of variable sub-stack}
00000836  2          STACK^.LENGTH := 4;
00000842  2          END;
00000846  2      SPEC_LINE,                  {line}
00000846  2      SPEC_INDEX : BEGIN          {numeric index}
00000846  2          STACK^.VALUE := L_VAL;
00000852  2          STACK^.LENGTH := 8;
0000085E  2          END;
00000862  2      SPEC_ADDRESS,
00000862  2      SPEC_VALUE : BEGIN          {value}
00000862  2          STACK^.VALUE := L_VAL;
0000086E  2          STACK^.BASE := S_VAL;
0000087A  2          STACK^.LENGTH := 10;
00000886  2          END;
0000088A  2      SPEC_DXVAL : BEGIN          {done_care value}
0000088A  2          STACK^.VALUE := L_VAL;
00000896  2          STACK^.MASK := INTEGER(IDENT);
```

```
00000884  2          STACK^.LENGTH := 14;
000008B0  2          END;
000008B4  2      SPEC_SCALAR,              {scalar index}
000008B4  2      SPEC_IDENT,               {identifier}
000008B4  2      SPEC_PROC,                {path_proc_name}
000008B4  2      SPEC_SYMBOL,              {symbol}
000008B4  2      SPEC_MODULE : BEGIN       {module}
000008B4  2          STACK^.IDENT := IDENT;
000008CA  2          STACK^.LENGTH := 6 + SHIFT(SHIFT(STACK^.IDENT[0],-13),+1);
000008EA  2          END;
000008EE  2      SPEC_FILE : BEGIN         {path_file_name}
000008EE  2          STACK^.IDENT := IDENT;
00000904  2          STACK^.DISC := S_VAL;
00000910  2          STACK^.LENGTH := 22;
0000091C  2          END;
00000920  2      SPEC_PTR,                 {^, ->, *}
00000920  2      SPEC_OPERAND : BEGIN      {operand}
00000920  2          STACK^.OPERAND := S_VAL;
0000092C  2          STACK^.LENGTH := 6;
00000938  2          END;
0000093C  2      OTHERWISE SYSTEM_MESSAGE(111,INT(OP_CODE),Error);
0000094E  2      END;
0000098C  2  IF INTEGER(SPEC_STACK_PTR) + STACK^.LENGTH < (INTEGER(SPEC_STACK) + SHIFT(SPECABLE_SIZE,+1) - 22) THEN
000009B4  2      INCREMENT_STACK(STACK)                                                                           { ^ worse case length }
000009C4  2  ELSE
000009C4  2      GENERAL_MESSAGE(13,Error);
000009D2  2  STACK^.OP_CODE := SPEC_END;      {make sure stack is always terminated}
000009DC  2  STACK^.LENGTH := 0;              {give termination a length of 0}
000009E6  2  END;
00000000  1  .
```

End of compilation, number of errors=    0

```
00000000  1  "68000" PREPROCESS
00000000  1  $BASE_PAGES
00000000  1  $WIDTH 120$
00000000  1
00000000  1  PROGRAM MODIFY_;
00000000  1
00000000  1  $EXTENSIONS ON$
00000000  1  $LIB_ABS_LONG$
00000000  1  $WARN OFF$
00000000  1
00000000  1  CONST
00000000  1      BLANK = 20H;
00000000  1
00000000  1  TYPE
00000000  1      INT = SIGNED_16;
00000000  1      PTR = ^ INTEGER;
00000000  1  {   WORD_PTR = ^ INT;            }
00000000  1      BYTE_PTR = ^ UNSIGNED_8;
00000000  1      VECTORO_7 = ARRAY[0..7] OF INT;
00000000  1      FNORMAME = ARRAY[0..7] OF INT;
00000000  1  {   DOUBLE_WORD = RECORD
00000000  1                 MSW : INT;
00000000  1                 LSW : INT;
00000000  1                 END;             }
00000000  1  {   COMPLEX_TYPE = RECORD
00000000  1                 VALUE : DOUBLE_WORD;
00000000  1                 MASK : DOUBLE_WORD;
00000000  1                 END;             }
00000000  1  #INCLUDE ICMD_DATA:SODAMON
00000000  1  #INCLUDE ISPEC_DATA:SODAMON
00000000  1  #INCLUDE IDISPLAY:SODAMON
00000000  1  #INCLUDE INCLUDE:KIP
00000000  1
00000000  1  VAR
00000000  1  $EXTVAR+$
00000000  1  $FAR$
00000000  1      CURRENT_FORMATS : ARRAY[0..2] OF FMT_PTR;
00000000  1  $BASE_PAGES
00000000  1      MEAS_SETUP : CMD_ARRAY;
00000000  1      MEASUREMENT_TYPE : INT;
00000000  1      MEAS_DISP_TYPE : INT;
00000000  1  $EXTVAR-$
```

```
00000000  1
00000000  1  $CALL_ABS_LONG ON$
00000000  1  PROCEDURE BPC_WRITE(ADDR_68K : INTEGER; ADDR_BPC : INT; LENGTH : INT); EXTERNAL;
00000000  1  PROCEDURE OUTIT(L :  CHAR; V : INT; D : CHAR); EXTERNAL;
00000000  1  $CALL_PC_SHORT ON$
00000000  1  PROCEDURE FORMAT (SIGNED:BOOLEAN; SOURCE:BYTE_PTR; SOURCESIZE:INT;
00000000  2                    DEST:BYTE_PTR; VAR DESTSIZE:INT; BASE:INT; JUSTIFY:INT); EXTERNAL;
00000000  1  PROCEDURE FORMAT_SYMBOL(VAR DISPLAY : DISPLAY_TYPE); EXTERNAL;
00000000  1  PROCEDURE FORMAT_STACK(VAR DISPLAY : DISPLAY_TYPE); EXTERNAL;
00000000  1  PROCEDURE FMT_INTEGER(VAR DISPLAY : DISPLAY_TYPE; SOURCE : INTEGER;
00000000  2                        BASE : INT; LAST_COL : INT; SPACE : BOOLEAN); EXTERNAL;
00000000  1  PROCEDURE FMT_KEYWORD(VAR DISPLAY : DISPLAY_TYPE;
00000000  2                        BYTE_PTR : PTR; LAST_COL : INT; SPACE : BOOLEAN); EXTERNAL;
00000000  1  PROCEDURE FMT_FILE(VAR DISPLAY : DISPLAY_TYPE;
00000000  2                     VAR NAME : VECTOR0_7; DISC : INT;
00000000  2                     LAST_COL : INT; SPACE : BOOLEAN); EXTERNAL;
00000000  1  PROCEDURE FMT_IDENT(VAR DISPLAY : DISPLAY_TYPE;
00000000  2                      VAR IDENT : VECTOR0_7; LAST_COL : INT; SPACE : BOOLEAN); EXTERNAL;
00000000  1  PROCEDURE SYSTEM_MESSAGE(MESS_NUM, MESS_CODE : INT; MESSAGE : MESSAGE_TYPES); EXTERNAL;
00000000  1  PROCEDURE INCREMENT_STACK(VAR STACK : SPECABLE_TYPE_PTR); EXTERNAL;
00000000  1
00000000  1  PROCEDURE ERASE_COMMAND(VAR LINE : COMMAND_LINE_PTR);
00000000  2  VAR
00000000  2     I : INT;
00000004  2  BEGIN
00000004  2  FOR I := 0 TO COMMAND_SIZE DO
00000008  2     LINE^[I] := BLANK;
0000002A  2  END;
00000000  1
00000000  1  PROCEDURE FMT_SPEC(STACK_PTR : SPECABLE_TYPE_PTR; VAR DISPLAY : DISPLAY_TYPE; TERMINATION : INT);
00000000  2  VAR
00000000  2  $EXTVAR+$
00000000  2  $TARS
00000000  2     read : PTR;
00000000  2     write : PTR;
00000000  2     entry : PTR;
00000000  2     exit : PTR;
00000000  2     ATS : PTR;
00000000  2     COLON : PTR;
00000000  2     to : PTR;
00000000  2     any_state : PTR;
00000000  2     all : PTR;
00000000  2     followed_by : PTR;
00000000  2     or : PTR;
00000000  2     LEFT_BRACKET : PTR;
00000000  2     RIGHT_BRACKET : PTR;
00000000  2     PERIOD : PTR;
00000000  2     UP_ARROW : PTR;
00000000  2     RIGHT_ARROW : PTR;
00000000  2     STAR : PTR;
00000000  2     COMMA : PTR;
00000000  2     RPAREN : PTR;
00000000  2     LPAREN : PTR;
00000000  2  $BASE_PAGE$
00000000  2  $EXTVAR-$
00000000  2     ON_VAR : BOOLEAN;
00000001  2     LINE_RANGE : BOOLEAN;
00000002  2     SKIP_THE_DOT : BOOLEAN;
00000003  2     FIRST_VAR : BOOLEAN;
00000004  2     FIRST_MOD : BOOLEAN;
00000032  2  BEGIN
00000032  2  WITH DISPLAY DO BEGIN
0000003A  2  ON_VAR := FALSE;
0000003E  2  LINE_RANGE := FALSE;
00000042  2  SKIP_THE_DOT := FALSE;
00000046  2  FIRST_VAR := TRUE;
0000004C  2  FIRST_MOD := TRUE;
00000052  2  WHILE STACK_PTR^.OP_CODE <> TERMINATION DO
00000060  2     BEGIN
00000060  2     CASE STACK_PTR^.OP_CODE OF
00000068  2          SPEC_VEND : BEGIN          {end of variable sub-stack}
00000068  2               ON_VAR := FALSE;
0000006C  2  {            COLUMN := COLUMN + 1;             }
0000006C  2               END;
```

```
00000070  2   SPEC_END : BEGIN          {end of spec stack}
00000070  2       END;
00000074  2   SPEC_PTR : BEGIN          {*,->,^}
00000074  2       CASE STACK_PTR^.OPERAND OF
00000082  2           SPEC_OP_UP : FMT_KEYWORD(DISPLAY,UP_ARROW,COMMAND_SIZE,FALSE);
000000A2  2           SPEC_OP_RO : BEGIN
000000A2  2               FMT_KEYWORD(DISPLAY,RIGHT_ARROW,COMMAND_SIZE,FALSE);
000000BE  2               SKIP_THE_DOT := TRUE;
000000C4  2               END;
000000C8  2           SPEC_OP_ST : ; {don't display this star}
000000CC  2           SPEC_OP_TS : BEGIN
000000CC  2               IF NOT FIRST_VAR THEN
000000D4  2                   FMT_KEYWORD(DISPLAY,COMMA,COMMAND_SIZE,TRUE)
000000F6  2               ELSE
000000F6  2                   IF OP_CODES(MEASUREMENT_TYPE) = TR_DAT THEN
00000102  2                       FMT_KEYWORD(DISPLAY,LPAREN,COMMAND_SIZE,TRUE);
00000120  2               FMT_KEYWORD(DISPLAY,STAR,COMMAND_SIZE,FALSE);
0000013C  2               ON_VAR := TRUE;
00000142  2               SKIP_THE_DOT := TRUE;
00000148  2               END;
0000014C  2           OTHERWISE ; {no error trap}
0000014C  2           END;
00000178  2       END;
0000017C  2   SPEC_INDEX : BEGIN        {numeric index}
0000017C  2       FMT_KEYWORD(DISPLAY,LEFT_BRACKET,COMMAND_SIZE,FALSE);
00000199  2       FMT_INTEGER(DISPLAY,STACK_PTR^.VALUE,10,COMMAND_SIZE,FALSE);
000001BA  2       FMT_KEYWORD(DISPLAY,RIGHT_BRACKET,COMMAND_SIZE,FALSE);
000001D6  2       END;
000001DA  2   SPEC_SCALAR : BEGIN       {scalar index}
000001DA  2       FMT_KEYWORD(DISPLAY,LEFT_BRACKET,COMMAND_SIZE,FALSE);
000001F6  2       FMT_IDENT(DISPLAY,STACK_PTR^.IDENT,COMMAND_SIZE,FALSE);
00000214  2       FMT_KEYWORD(DISPLAY,RIGHT_BRACKET,COMMAND_SIZE,FALSE);
00000230  2       END;
00000234  2   SPEC_IDENT : BEGIN        {identifier}
00000234  2       IF NOT ON_VAR THEN
0000023C  2           BEGIN
0000023C  2           IF NOT FIRST_VAR THEN
00000244  2               FMT_KEYWORD(DISPLAY,COMMA,COMMAND_SIZE,TRUE)
00000266  2           ELSE
00000266  2               IF OP_CODES(MEASUREMENT_TYPE) = TR_DAT THEN
00000272  2                   FMT_KEYWORD(DISPLAY,LPAREN,COMMAND_SIZE,TRUE);
00000290  2           END
00000294  2       ELSE
00000294  2           IF NOT SKIP_THE_DOT THEN
0000029C  2               FMT_KEYWORD(DISPLAY,PERIOD,COMMAND_SIZE,FALSE);
000002B8  2       FMT_IDENT(DISPLAY,STACK_PTR^.IDENT,COMMAND_SIZE,FALSE);
000002D6  2       ON_VAR := TRUE;
000002DC  2       SKIP_THE_DOT := FALSE;
000002E0  2       FIRST_VAR := FALSE;
000002E4  2       END;
000002E8  2   SPEC_LINE : BEGIN         {line}
000002E8  2       IF NOT LINE_RANGE THEN
000002F0  2           BEGIN
000002F0  2           FMT_INTEGER(DISPLAY,STACK_PTR^.VALUE,10,COMMAND_SIZE,FALSE);
00000312  2           LINE_RANGE := TRUE;
00000318  2           END
0000031C  2       ELSE BEGIN
0000031C  2           COLUMN := COLUMN + 1;
0000032A  2           FMT_KEYWORD(DISPLAY,to,COMMAND_SIZE,TRUE);
00000348  2           FMT_INTEGER(DISPLAY,STACK_PTR^.VALUE,10,COMMAND_SIZE,FALSE);
0000036A  2           END;
0000036A  2       END;
0000036E  2   SPEC_SYMBOL,              {symbol}
0000036E  2   SPEC_MODULE : BEGIN       {module}
0000036E  2       IF OP_CODES(MEASUREMENT_TYPE) = TR_DAT THEN
0000037A  2           BEGIN
0000037A  2           IF NOT FIRST_MOD THEN
00000382  2               FMT_KEYWORD(DISPLAY,RPAREN,COMMAND_SIZE,TRUE);
000003A0  2           END
000003A4  2       ELSE BEGIN
000003A4  2           IF NOT FIRST_MOD THEN
000003AC  2               FMT_KEYWORD(DISPLAY,COMMA,COMMAND_SIZE,TRUE);
000003CA  2           END;
000003CA  2       FMT_IDENT(DISPLAY,STACK_PTR^.IDENT,COMMAND_SIZE,FALSE);
```

```
000003E8  2        FIRST_MOD := FALSE;
000003EC  2        FIRST_VAR := TRUE;
000003F2  2        END;
000003F6  2    SPEC_VALUE : BEGIN          {value}
000003F6  2        FMT_INTEGER(DISPLAY,STACK_PTR^.VALUE,16,COMMAND_SIZE,FALSE);
00000418  2        END;
0000041C  2    SPEC_DKVAL : BEGIN          {dont_care value}
0000041C  2        END;
00000420  2    SPEC_PROC : BEGIN           {path_proc_name}
00000420  2        FMT_KEYWORD(DISPLAY,ATS,COMMAND_SIZE,FALSE);
0000043C  2        FMT_IDENT(DISPLAY,STACK_PTR^.IDENT,COMMAND_SIZE,FALSE);
0000045A  2        END;
0000045E  2    SPEC_FILE : BEGIN           {path_file_name}
0000045E  2        FMT_KEYWORD(DISPLAY,COLON,COMMAND_SIZE,FALSE);
0000047A  2        FMT_FILE(DISPLAY,STACK_PTR^.IDENT,STACK_PTR^.DISC,COMMAND_SIZE,TRUE);
0000049E  2        LINE_RANGE := FALSE;
000004A2  2  {     COLUMN := COLUMN + 1;          }
000004A2  2        END;
000004A6  2    SPEC_OPERAND : BEGIN        {operand}
000004A6  2        CASE STACK_PTR^.OPERAND OF
000004B4  2            SPEC_OP_RE : BEGIN          {read}
000004B4  2                COLUMN := COLUMN + 1;
000004C2  2                FMT_KEYWORD(DISPLAY,read,COMMAND_SIZE,FALSE);
000004DE  2                END;
000004E2  2            SPEC_OP_WR : BEGIN          {write}
000004E2  2                COLUMN := COLUMN + 1;
000004F0  2                FMT_KEYWORD(DISPLAY,write,COMMAND_SIZE,FALSE);
0000050C  2                END;
00000510  2            SPEC_OP_RW : BEGIN          {read_write}
00000510  2                END;
00000514  2            SPEC_OP_EE : BEGIN          {entry_exit}
00000514  2                END;
00000518  2            SPEC_OP_EN : BEGIN          {entry}
00000518  2                COLUMN := COLUMN + 1;
00000526  2                FMT_KEYWORD(DISPLAY,entry,COMMAND_SIZE,FALSE);
00000542  2                END;
00000546  2            SPEC_OP_EX : BEGIN          {exit}
00000546  2                COLUMN := COLUMN + 1;
00000554  2                FMT_KEYWORD(DISPLAY,exit,COMMAND_SIZE,FALSE);
00000570  2                END;
00000574  2            SPEC_OP_PC : BEGIN          {program_counter}
00000574  2                END;
00000578  2            SPEC_OP_TA : BEGIN          {transfer_address}
00000578  2                END;
0000057C  2            SPEC_OP_EQ : BEGIN          {=}
0000057C  2                END;
00000580  2            SPEC_OP_NE : BEGIN          {<>}
00000580  2                END;
00000584  2            SPEC_OP_LT : BEGIN          {<}
00000584  2                END;
00000588  2            SPEC_OP_GT : BEGIN          {>}
00000588  2                END;
0000058C  2            SPEC_OP_LE : BEGIN          {<=}
0000058C  2                END;
00000590  2            SPEC_OP_GE : BEGIN          {>=}
00000590  2                END;
00000594  2            SPEC_OP_ANY : BEGIN         {any_state}
00000594  2                FMT_KEYWORD(DISPLAY,any_state,COMMAND_SIZE,FALSE);
000005B0  2                END;
000005B4  2            SPEC_OP_ALL : BEGIN         {all}
000005B4  2                IF NOT FIRST_MOD THEN
000005BC  2                    FMT_KEYWORD(DISPLAY,COMMA,COMMAND_SIZE,TRUE);
000005DA  2                FMT_KEYWORD(DISPLAY,all,COMMAND_SIZE,FALSE);
000005F6  2                FIRST_MOD := FALSE;
000005FA  2                END;
000005FE  2            SPEC_OP_BY : BEGIN          {followed_by}
000005FE  2                COLUMN := COLUMN + 1;
0000060C  2                FMT_KEYWORD(DISPLAY,followed_by,COMMAND_SIZE,TRUE);
0000062A  2                FIRST_MOD := TRUE;
00000630  2                END;
00000634  2            SPEC_OP_OR : BEGIN          {or}
00000634  2                COLUMN := COLUMN + 1;
00000642  2                FMT_KEYWORD(DISPLAY,or,COMMAND_SIZE,TRUE);
00000660  2                FIRST_MOD := TRUE;
```

```
00000A66  2                      END;
00000A6A  2                 SPEC_OP_OP : BEGIN          (default path used)
00000A6A  2                      END;
00000A6E  2                 OTHERWISE SYSTEM_MESSAGE(711,INT(STACK_PTR^.OPERAND),Error);
00000684  2                 END;
000006E2  2            END;
000006E6  2       SPEC_ADDRESS : BEGIN       (address)
000006E6  2            END;
000006EA  2       OTHERWISE SYSTEM_MESSAGE(511,INT(STACK_PTR^.OP_CODE),Error);
000006FE  2       END;
0000070C  2    INCREMENT_STACK(STACK_PTR);
00000746  2    END;
0000074A  2 END;
0000074A  2 END;
00000000  1
00000000  1 $GLOBPROC+$
00000000  1
00000000  1 PROCEDURE MODIFY_MEASUREMENT;
00000000  2 VAR
00000000  2 $EXTVAR+$
00000000  2 $FAR$
00000000  2     setup : PTR;
00000000  2     trace : PTR;
00000000  2     count_statements : PTR;
00000000  2     time_modules : PTR;
00000000  2     break : PTR;
00000000  2     variables : PTR;
00000000  2     data_flow : PTR;
00000000  2     modules : PTR;
00000000  2     statements : PTR;
00000000  2     on : PTR;
00000000  2     OPAREN : PTR;
00000000  2 $BASE_PAGE$
00000000  2 $EXTVAR-$
00000000  2     STACK_PTR : SPECABLE_TYPE_PTR;
00000004  2     DISPLAY : DISPLAY_TYPE;
00000024  2     L_TEMP : COMMAND_LINE_PTR;
00000028  2     I : INT;
00000752  2 BEGIN
00000752  2 WITH DISPLAY DO BEGIN
00000758  2 NEW(L_TEMP);
0000076C  2 LINE := LINE_BUFFER_PTR(L_TEMP);
00000774  2 ERASE_COMMAND(L_TEMP);
0000077E  2 COLUMN := 0;
00000786  2 FMT_KEYWORD(DISPLAY,setup,COMMAND_SIZE,TRUE);
000007A2  2 STACK_PTR := SPECABLE_TYPE_PTR(MEAS_SETUP[MEASUREMENT].SPEC);
000007AC  2 CASE OP_CODES(MEASUREMENT_TYPE) OF
000007B8  2     TR_VAR : BEGIN              (trace variables)
000007B8  2          FMT_KEYWORD(DISPLAY,trace,COMMAND_SIZE,TRUE);
000007D4  2          FMT_KEYWORD(DISPLAY,variables,COMMAND_SIZE,TRUE);
000007F0  2          END;
000007F4  2     TR_ASN : BEGIN              (trace variables last_access)
000007F4  2          END;
000007F8  2     TR_DAT : BEGIN              (trace data_flow)
000007F8  2          FMT_KEYWORD(DISPLAY,trace,COMMAND_SIZE,TRUE);
00000814  2          FMT_KEYWORD(DISPLAY,data_flow,COMMAND_SIZE,TRUE);
00000830  2          END;
00000834  2     TR_MOD : BEGIN              (trace modules)
00000834  2          FMT_KEYWORD(DISPLAY,trace,COMMAND_SIZE,TRUE);
00000850  2          FMT_KEYWORD(DISPLAY,modules,COMMAND_SIZE,TRUE);
0000086C  2          END;
00000870  2     TR_NXN : BEGIN              (trace statements don't care)
00000870  2          FMT_KEYWORD(DISPLAY,trace,COMMAND_SIZE,TRUE);
0000088C  2          FMT_KEYWORD(DISPLAY,statements,COMMAND_SIZE,TRUE);
000008A8  2          END;
000008AC  2     TR_STA : BEGIN              (trace statements)
000008AC  2          FMT_KEYWORD(DISPLAY,trace,COMMAND_SIZE,TRUE);
000008C8  2          FMT_KEYWORD(DISPLAY,statements,COMMAND_SIZE,TRUE);
000008E4  2          END;
000008E8  2     TI_MOD : BEGIN              (time modules)
000008E8  2          FMT_KEYWORD(DISPLAY,time_modules,COMMAND_SIZE,TRUE);
00000904  2          END;
00000908  2     CT_STA : BEGIN              (count statements)
00000908  2          FMT_KEYWORD(DISPLAY,count_statements,COMMAND_SIZE,TRUE);
```

```
00000924  2           END;
00000928  2      BRK_ON : BEGIN              {break on}
00000928  2           FMT_KEYWORD(DISPLAY,break,COMMAND_SIZE,TRUE);
00000944  2           FMT_KEYWORD(DISPLAY,on,COMMAND_SIZE,TRUE);
00000960  2           END;
00000964  2      OTHERWISE SYSTEM_MESSAGE(521,MEASUREMENT_TYPE,Error);
00000976  2      END;
000009AE  2  FMT_SPEC(STACK_PTR,DISPLAY,SPEC_END);
000009C4  2  IF OP_CODES(MEASUREMENT_TYPE) = TR_DAT THEN
000009D0  2      FMT_KEYWORD(DISPLAY,RPAREN,COMMAND_SIZE,FALSE);
000009EA  2  BPC_WRITE(INTEGER(L_TEMP) + 2,0FD60H,119);
00000A02  2  I := OFACOH + COLUMN + 2;
00000A18  2  BPC_WRITE(INTEGER(ADDR(I)),0FF9EH,1);        { ENDDATE := FBDOH; }
00000A2E  2  DISPOSE(L_TEMP);
00000A40  2  END;
00000A40  2  END;
00000000  1
00000000  1  PROCEDURE MODIFY_ENABLE;
00000000  2  VAR
00000000  2  $EXTVAR+$
00000000  2  $FARS
00000000  2      setup : PTR;
00000000  2      measurement_enable : PTR;
00000000  2      off : PTR;
00000000  2      on : PTR;
00000000  2  $BASE_PAGES
00000000  2  $EXTVAR-$
00000000  2      STACK_PTR : SPECABLE_TYPE_PTR;
00000004  2      DISPLAY : DISPLAY_TYPE;
00000026  2      L_TEMP : COMMAND_LINE_PTR;
0000002A  2      I : INT;
00000A48  2  BEGIN
00000A48  2  WITH DISPLAY DO BEGIN
00000A50  2  NEW(L_TEMP);
00000A62  2  LINE := LINE_BUFFER_PTR(L_TEMP);
00000A6A  2  ERASE_COMMAND(L_TEMP);
00000A74  2  COLUMN := 0;
00000A7C  2  FMT_KEYWORD(DISPLAY,setup,COMMAND_SIZE,TRUE);
00000A98  2  FMT_KEYWORD(DISPLAY,measurement_enable,LINE_SIZE,TRUE);
00000AB4  2  STACK_PTR := SPECABLE_TYPE_PTR(MEAS_SETUP[START_ON].SPEC);
00000ADE  2  IF (STACK_PTR^.OP_CODE = SPEC_OPERAND) AND (STACK_PTR^.OPERAND = SPEC_OP_OFF) THEN
00000AE6  2      FMT_KEYWORD(DISPLAY,off,LINE_SIZE,FALSE)
00000B04  2  ELSE BEGIN
00000B04  2      FMT_KEYWORD(DISPLAY,on,LINE_SIZE,TRUE);
00000B20  2      FMT_SPEC(STACK_PTR,DISPLAY,SPEC_END);
00000B36  2      END;
00000B36  2  BPC_WRITE(INTEGER(L_TEMP) + 2,0FD60H,119);
00000B4E  2  I := OFACOH + COLUMN + 2;
00000B64  2  BPC_WRITE(INTEGER(ADDR(I)),0FF9EH,1);        { ENDDATE := FBDOH; }
00000B7A  2  DISPOSE(L_TEMP);
00000B8C  2  END;
00000B8C  2  END;
00000000  1
00000000  1  PROCEDURE MODIFY_DISABLE;
00000000  2  VAR
00000000  2  $EXTVAR+$
00000000  2  $FARS
00000000  2      setup : PTR;
00000000  2      measurement_disable : PTR;
00000000  2      off : PTR;
00000000  2      on : PTR;
00000000  2      window : PTR;
00000000  2  $BASE_PAGES
00000000  2      CONFIGURATION : CONFIG_REC_TYPE;
00000000  2  $EXTVAR-$
00000000  2      STACK_PTR : SPECABLE_TYPE_PTR;
00000004  2      DISPLAY : DISPLAY_TYPE;
00000026  2      L_TEMP : COMMAND_LINE_PTR;
0000002A  2      I : INT;
00000B94  2  BEGIN
00000B94  2  WITH DISPLAY DO BEGIN
00000B9C  2  NEW(L_TEMP);
00000BAE  2  LINE := LINE_BUFFER_PTR(L_TEMP);
00000BB6  2  ERASE_COMMAND(L_TEMP);
00000BC0  2  COLUMN := 0;
```

```
00000BC8  2  FMT_KEYWORD(DISPLAY,setup,COMMAND_SIZE,TRUE);
00000BE4  2  FMT_KEYWORD(DISPLAY,measurement_disable,LINE_SIZE,TRUE);
00000C00  2  STACK_PTR := SPECABLE_TYPE_PTR(MEAS_SETUP[STOP_ON].SPEC);
00000C28  2  IF (STACK_PTR^.OP_CODE = SPEC_OPERAND) AND (STACK_PTR^.OPERAND = SPEC_OP_OFF) THEN
00000C32  2      FMT_KEYWORD(DISPLAY,off,LINE_SIZE,FALSE)
00000C50  2  ELSE BEGIN
00000C50  2      IF CONFIGURATION.WINDOW THEN
00000C58  2          FMT_KEYWORD(DISPLAY,window,LINE_SIZE,TRUE);
00000C74  2      FMT_KEYWORD(DISPLAY,on,LINE_SIZE,TRUE);
00000C90  2      FMT_SPEC(STACK_PTR,DISPLAY,SPEC_END);
00000CA6  2      END;
00000CA6  2  BPC_WRITE(INTEGER(L_TEMP) + 2,0FD60H,119);
00000CBE  2  I := 0FAC0H + COLUMN + 2;
00000CD4  2  BPC_WRITE(INTEGER(ADDR(I)),0FF9BH,1);         { ENDDATE := FBB0H; }
00000CEA  2  DISPOSE(L_TEMP);
00000CFC  2  END;
00000CFC  2  END;
00000000  1
00000000  1  PROCEDURE MODIFY_DISPLAY;
00000000  2  VAR
00000000  2  $EXTVAR+$
00000000  2  $FAR$
00000000  2      DISPLAY_FIELDS : ARRAY[0..1] OF PTR;
00000000  2      display : PTR;
00000000  2      then : PTR;
00000000  2  $BASE_PAGE$
00000000  2  $EXTVAR-$
00000000  2      DISPLAY : DISPLAY_TYPE;
00000022  2      L_TEMP : COMMAND_LINE_PTR;
00000026  2      I : INT;
00000D04  2  BEGIN
00000D04  2  WITH DISPLAY DO BEGIN
00000D0C  2  NEW(L_TEMP);
00000D1E  2  LINE := LINE_BUFFER_PTR(L_TEMP);
00000D26  2  ERASE_COMMAND(L_TEMP);
00000D30  2  COLUMN := 0;
00000D38  2  FMT_KEYWORD(DISPLAY,display,COMMAND_SIZE,TRUE);
00000D54  2  I := 0;
00000D58  2  WHILE CURRENT_FORMATS[MEAS_DISP_TYPE]^[I].IDENT <> TERMINAT DO
00000D7A  2      BEGIN
00000D7A  2      FMT_KEYWORD(DISPLAY,DISPLAY_FIELDS[CURRENT_FORMATS[MEAS_DISP_TYPE]^[I].IDENT],COMMAND_SIZE,TRUE);
00000DB0  2      FMT_INTEGER(DISPLAY,CURRENT_FORMATS[MEAS_DISP_TYPE]^[I].WIDTH,10,COMMAND_SIZE,TRUE);
00000DEC  2      I := I + 1;
00000DF0  2      IF CURRENT_FORMATS[MEAS_DISP_TYPE]^[I].IDENT <> TERMINAT THEN
00000E12  2          FMT_KEYWORD(DISPLAY,then,COMMAND_SIZE,TRUE);
00000E2E  2      END;
00000E32  2  BPC_WRITE(INTEGER(L_TEMP) + 2,0FD60H,119);
00000E4A  2  I := 0FAC0H + COLUMN + 1;
00000E60  2  BPC_WRITE(INTEGER(ADDR(I)),0FF9BH,1);         { ENDDATE := FBB0H; }
00000E76  2  I := 0FBAFH;
00000E7C  2  DISPOSE(L_TEMP);
00000E8E  2  END;
00000E8E  2  END;
00000000  1  .

End of compilation, number of errors=    0

00000000  1  "68000" PREPROCESS
00000000  1  $BASE_PAGE$
00000000  1  $WIDTH 120$
00000000  1
00000000  1  PROGRAM MONITOR_;
00000000  1
00000000  1  $EXTENSIONS ON$
00000000  1  $LIB_ABS_LONG$
00000000  1  $WARN OFF$
00000000  1
00000000  1  CONST
00000000  1      MONITOR_CHAN = 060C00H;
00000000  1      MONITOR_PRI = -50;
00000000  1
00000000  1  TYPE
00000000  1      INT = SIGNED_16;
00000000  1      VECTOR0_7 = ARRAY[0..7] OF INT;
00000000  1      FMGRNAME = ARRAY[0..7] OF INT;
```

```
00000000  1      PTR = ^ INTEGER;
00000000  1      SUFF_PTR = ^ VECTOR0_7;
00000000  1      DOUBLE_WORD = RECORD
00000000  2                 MSW : INT;
00000000  2                 LSW : INT;
00000000  1                 END;
00000000  1      COMPLEX_TYPE = RECORD
00000000  2                 VALUE : DOUBLE_WORD;
00000000  2                 MASK : DOUBLE_WORD;
00000000  1                 END;
00000000  1   #INCLUDE ICDS_68K:SODAMES
00000000  1   #INCLUDE IAPPLY_68K:SODAMES
00000000  1   #INCLUDE ICHILDREN:SODAMON
00000000  1   #INCLUDE ICMD_DATA:SODAMO
00000000  1   #INCLUDE ISPEC_DATA:SODAMO
00000000  1   #INCLUDE IDISPLAY:SODAMO
00000000  1   #INCLUDE INCLUDE:KIP
00000000  1
00000000  1   VAR
00000000  1   $EXTVAR+$
00000000  1   $BASE_PAGE$
00000000  1      APPLY_STACK : A_TOKEN_PTR;
00000000  1      MARK_PTR : PTR;
00000000  1      SEMANTIC_ERROR : INT;
00000000  1      SEMANTIC_WARNING : BOOLEAN;
00000000  1      CDS : CDS_TYPE;
00000000  1      SPEC_STACK : SPECABLE_ARRAY_PTR;
00000000  1      SPEC_STACK_PTR : SPECABLE_TYPE_PTR;
00000000  1      VALID_FOOTDC : BOOLEAN;
00000000  1      SYMBOL_COUNT : INT;
00000000  1      DISPLAY : DISPLAY_TYPE;
00000000  1      STACK_AREA : ARRAY[0..1] OF INT;
00000000  1      IMD_STACK : ARRAY[0..1] OF INT;
00000000  1      EMULATION_ID : INT;
00000000  1   $EXTVAR-$
00000000  1
00000000  1   $CALL_ABS_LONG ON$
00000000  1   PROCEDURE SET_PRI_(PRI : INT); EXTERNAL;
00000000  1   PROCEDURE SLEEP_ (CHAN : INTEGER; PRI : INT); EXTERNAL;
00000000  1   PROCEDURE P_MESSAGE(MESS_PTR : INTEGER; CODE : INT); EXTERNAL;
00000000  1   PROCEDURE OUTIT(L:CHAR;V:INT;D:CHAR); EXTERNAL;
00000000  1   PROCEDURE DISPLAY_SOMETHING(DISPLAY : INT; COPY : BOOLEAN); EXTERNAL;
00000000  1   PROCEDURE SYSTEM_MESSAGE(MESS_NUM, MESS_CODE : INT; MESSAGE : MESSAGE_TYPES); EXTERNAL;
00000000  1   PROCEDURE GENERAL_MESSAGE(MESS_NUM : INT; MESSAGE_CODE : MESSAGE_TYPES); EXTERNAL;
00000000  1   PROCEDURE WAIT_FOR_DISPLAY; EXTERNAL;
00000000  1   $CALL_PC_SHORT ON$
00000000  1   PROCEDURE INITIALIZE; EXTERNAL;
00000000  1   PROCEDURE RESET_POINTERS; EXTERNAL;
00000000  1   PROCEDURE APPLY(REAL : BOOLEAN); EXTERNAL;
00000000  1   PROCEDURE READ_S_AREA; EXTERNAL;
00000000  1
00000000  1   $GLOBPROC+$
0000000E  1
0000000E  1   BEGIN
0000000E  1   INITIALIZE;
00000012  1   SET_PRI_(MONITOR_PRI);
0000001E  1   WHILE TRUE DO
0000001E  1      BEGIN
0000001E  1      DISPLAY.COMMAND := CDS.COMMAND;
00000024  1      SEMANTIC_ERROR := 0;
00000028  1      SEMANTIC_WARNING := FALSE;
0000002C  1      CASE CDS.COMMAND OF
00000036  1           10 : BEGIN {down arrow}
00000036  1                END;
0000003A  1           11 : BEGIN {up arrow}
0000003A  1                END;
0000003E  1           12 : BEGIN {next page}
0000003E  1                DISPLAY.HORIZONTAL := DISPLAY.HORIZONTAL + 15;
00000044  1                DISPLAY_SOMETHING(Current,FALSE);
00000052  1                END;
00000056  1           13 : BEGIN {carrage return}
00000056  1                WAIT_FOR_DISPLAY;               {hold off command files}
0000005C  1                MARK(MARK_PTR);
00000068  1                NEW(SPEC_STACK);
```

```
0000007A  1             SPEC_STACK_PTR := SPECABLE_TYPE_PTR(SPEC_STACK);
00000080  1             RESET_POINTERS; {initialize stacks for apply productions}
00000084  1             SYMBOL_COUNT := 0;
00000088  1             DISPLAY.COMMAND := NO_OP;
0000008C  1             APPLY(FALSE);
00000094  1             IF (SEMANTIC_ERROR=0) THEN
0000009C  1                 APPLY(TRUE);  { EXECUTE THE COMMAND }
000000A6  1             IF MARK_PTR <> NIL THEN
000000AE  1                 RELEASE(MARK_PTR);
000000BA  1             IF DISPLAY.HOLD_DISPLAY THEN
000000C2  1                 DISPLAY.HOLD_DISPLAY := FALSE
000000CA  1             ELSE
000000CA  1                 DISPLAY_SOMETHING(Current,FALSE);
000000D8  1             END;
000000DC  1         18 : BEGIN {previous page}
000000DC  1             DISPLAY.HORIZONTAL := DISPLAY.HORIZONTAL - 15;
000000E2  1             DISPLAY_SOMETHING(Current,FALSE);
000000F0  1             END;
000000F4  1         19 : BEGIN {roll down}
000000F4  1             DISPLAY.HORIZONTAL := DISPLAY.HORIZONTAL - 1;
000000FC  1             DISPLAY_SOMETHING(Current,FALSE);
00000106  1             END;
0000010A  1         20 : BEGIN {roll up}
0000010A  1             DISPLAY.HORIZONTAL := DISPLAY.HORIZONTAL + 1;
0000010E  1             DISPLAY_SOMETHING(Current,FALSE);
0000011C  1             END;
00000120  1         21 : BEGIN {shift right arrow}
00000120  1             DISPLAY.VERTICAL := DISPLAY.VERTICAL - 1;
00000124  1             DISPLAY_SOMETHING(Current,FALSE);
00000132  1             END;
00000136  1         22 : BEGIN {shift left arrow}
00000136  1             DISPLAY.VERTICAL := DISPLAY.VERTICAL + 1;
0000013A  1             DISPLAY_SOMETHING(Current,FALSE);
00000148  1             END;
0000014C  1         100 : BEGIN {resume}
0000014C  1             APPLY_STACK := A_TOKEN_PTR(1010H);
00000154  1             APPLY_STACK^.APPLY := 0; {hold off commands}
0000015A  1             IF CDS.REQUEST_TYPE = INT(YOU_THERE) THEN         {BPC asks are you there}
00000166  1                 BEGIN
00000166  1                 CDS.REQUEST_TYPE := INT(IM_HERE);             {68K responds i'm here}
0000016C  1                 WHILE CDS.REQUEST_TYPE = INT(IM_HERE) DO ;
0000017A  1                 IF CDS.REQUEST_TYPE = INT(WHO_ARE_YOU) THEN  {BPC asks who are you}
00000186  1                     CDS.REQUEST_TYPE := EMULATION_ID;         {68K responds i'm emulator x}
0000018C  1                 WHILE CDS.REQUEST_TYPE = EMULATION_ID DO ;
0000019A  1                 CDS.REQUEST_TYPE := INT(IM_HERE);             {68K sets i'm here}
000001A0  1                 WHILE CDS.REQUEST_TYPE = INT(IM_HERE) DO ;
000001AE  1                 REPEAT UNTIL CDS.REQUEST_TYPE = INT(EMPTY);
000001B8  1                 END;
000001B8  1             READ_G_AREA;
000001BC  1             DISPLAY_SOMETHING(Current,FALSE);
000001CA  1             END;
000001CE  1         OTHERWISE ; {no error trap}
000001CE  1         END;
00000224  1     IF STACK_AREA[0] <> 01234H THEN
00000230  1         SYSTEM_MESSAGE(811,0,Error);
00000242  1     IF IMB_STACK[0] <> 01234H THEN
0000024E  1         SYSTEM_MESSAGE(812,0,Error);
00000250  1     APPLY_STACK := A_TOKEN_PTR(1010H);
00000268  1     APPLY_STACK^.APPLY := -1; {clear apply stack}
00000270  1     SLEEP_(MONITOR_CHAN,MONITOR_PRI);
00000282  1     END;
00000296  1 END
00000000  1 .
```

End of compilation, number of errors= 0

```
00000000  1  "68000" PREPROCESS
00000000  1  $BASE_PAGES
00000000  1  $WIDTH 120$
00000000  1
00000000  1  PROGRAM PAS_UTL_;
00000000  1
00000000  1  $EXTENSIONS ON$
00000000  1  $LIB_ABS_LONG$
00000000  1  $WARN OFF$
```

```
00000000  1
00000000  1  TYPE
00000000  1      INT = SIGNED_16;
00000000  1      PTR = ^ INTEGER;
00000000  1      BYTE_PTR = ^ BYTE;
00000000  1      WORD_PTR = ^ INT;
00000000  1      VECTOR0_7 = ARRAY[0..7] OF INT;
00000000  1      VECTOR0_15 = ARRAY[0..15] OF INT;
00000000  1      DOUBLE_BYTE = RECORD
00000000  2                 MSB : BYTE;
00000000  2                 LSB : BYTE;
00000000  1                 END;
00000000  1      DOUBLE_WORD = RECORD
00000000  2                 MSW : INT;
00000000  2                 LSW : INT;
00000000  1                 END;
00000000  1      LONG_PTR = ^ DOUBLE_WORD;
00000000  1      COMPLEX_TYPE = RECORD
00000000  2                 VALUE : DOUBLE_WORD;
00000000  2                 MASK : DOUBLE_WORD;
00000000  1                 END;
00000000  1      COMPLEX_PTR = ^ COMPLEX_TYPE;
00000000  1      BUFFER_TYPE = RECORD
00000000  2                 REC_LENGTH : INT;
00000000  2                 LENGTH : INT;
00000000  2                 ADD_LSW : INT;
00000000  2                 ADD_MSW : INT;
00000000  2                 BUFF : ARRAY[0..124] OF INT;
00000000  1                 END;
00000000  1      BUFFER_PTR = ^ BUFFER_TYPE;
00000000  1  #INCLUDE IOS_68K:SODAMES
00000000  1
00000000  1  VAR
00000000  1  $EXTVAR+$
00000000  1      OS : OS_TYPE;
00000000  1  $EXTVAR-$
00000000  1
00000000  1  PROCEDURE COPYBYTES (SOURCE, DESTINATION : INTEGER; LENGTH : INT); EXTERNAL;
00000000  1  $CALL_PC_LONG ON$
00000000  1  PROCEDURE FORK_ (PROC, STACK : INTEGER; VAR ID : INT); EXTERNAL;
00000000  1  PROCEDURE P_CLOSE (VAR DCB : INT; VAR FMGR_CODE : INT); EXTERNAL;
00000000  1  PROCEDURE P_OPEN (VAR FNAME : VECTOR0_7; FTYPE, DISC : INT;
00000000  2                   VAR DCB : INT; BUFSIZE : INT;
00000000  2                   VAR FMGR_CODE : INT); EXTERNAL;
00000000  1  PROCEDURE P_READ (VAR DCB : INT; VAR RBUFF : BUFFER_TYPE; LENGTH : INT;
00000000  2                   VAR FMGR_CODE : INT); EXTERNAL;
00000000  1  PROCEDURE P_FILE_ERR (VAR DCB : INT; FMGR_CODE : INT); EXTERNAL;
00000000  1  PROCEDURE P_MESSAGE(MESS_PTR : INTEGER; CODE : INT); EXTERNAL;
00000000  1  PROCEDURE P_FORMATTER(VAR TABLE:VECTOR0_15; DESTINATION : INTEGER); EXTERNAL;
00000000  1  PROCEDURE BPC_WRITE(ADDR_68K : INTEGER; ADDR_BPC : INT; LENGTH : INT); EXTERNAL;
00000000  1  PROCEDURE OUTIT(L:CHAR;V:INT;B:CHAR); EXTERNAL;
00000000  1  $CALL_PC_LONG OFF$
00000000  1
00000000  1  $GLOBPROC+$
00000000  1
00000000  1  PROCEDURE FIND_PROCESS(P_NUM : INT; VAR INDEX : INT);
00000000  2  VAR
00000000  2      I   INT;
00000004  2  BEGIN
00000004  2  INDEX := -1;
00000000  2  FOR I := 0 TO 15 DO
00000010  2      IF (OS[I].P_ID = P_NUM) AND (SHIFT(OS[I].STAT_PRI,-8) <> 3) THEN
0000004C  2          INDEX := I;
00000064  2  END;
00000000  1
00000000  1  PROCEDURE LOAD_A_FILE(VAR FILE_NAME : VECTOR0_7; DISC : INT);
00000000  2
00000000  2  CONST
00000000  2      TEMP_ADDR = 0100CH;
00000000  2
00000000  2  VAR
00000000  2      BUFFER : BUFFER_PTR;
00000004  2      PRI : INT;
00000006  2      DCB1 . INT;
```

```
00000008  2      FMGR_CODE : INT;
0000000A  2      STACK_ADDR_TEMP : PTR;
0000000E  2      STACK_ADD : INTEGER;
00000012  2      FORK_ADD : DOUBLE_WORD;
00000016  2      TEMP_ADD : DOUBLE_WORD;
0000001A  2      ID : INT;
0000006C  2
0000006C  2  BEGIN
0000006C  2  STACK_ADDR_TEMP := PTR(TEMP_ADDR);
00000074  2  NEW(BUFFER);
00000086  2  P_OPEN(FILE_NAME,4,DISC,DCB1,16,FMGR_CODE);
000000B0  2  IF FMGR_CODE <> 0 THEN P_FILE_ERR(DCB1,FMGR_CODE)
000000D0  2  ELSE BEGIN
000000D0  2      P_READ(DCB1,BUFFER^,128,FMGR_CODE);
000000F2  2      IF NOT((FMGR_CODE = 0) OR (FMGR_CODE = 1)) THEN P_FILE_ERR(DCB1,FMGR_CODE);
00000122  2      FORK_ADD.LSW := BUFFER^.ADD_MSW;
0000012C  2      FORK_ADD.MSW := BUFFER^.BUFF[0];
00000134  2      P_READ(DCB1,BUFFER^,128,FMGR_CODE);
00000156  2      IF NOT((FMGR_CODE = 0) OR (FMGR_CODE = 1)) THEN P_FILE_ERR(DCB1,FMGR_CODE);
00000186  2      WHILE (FMGR_CODE = 0) DO BEGIN
0000018E  2          TEMP_ADD.MSW := BUFFER^.ADD_MSW;
00000198  2          TEMP_ADD.LSW := BUFFER^.ADD_LSW;
0000019E  2          COPYBYTES(INTEGER(ADDR(BUFFER^.BUFF)),INTEGER(TEMP_ADD),BUFFER^.LENGTH);
000001B6  2          P_READ(DCB1,BUFFER^,128,FMGR_CODE);
000001D8  2          IF NOT((FMGR_CODE = 0) OR (FMGR_CODE = 1)) THEN P_FILE_ERR(DCB1,FMGR_CODE)
00000208  2          END;
0000020C  2      P_CLOSE(DCB1,FMGR_CODE);
00000220  2      IF FMGR_CODE <> 0 THEN P_FILE_ERR(DCB1,FMGR_CODE);
0000023C  2      STACK_ADD := STACK_ADDR_TEMP^;
00000244  2      IF STACK_ADD <> -1 THEN
00000252  2          FORK_(INTEGER(FORK_ADD),STACK_ADD,ID);
0000026C  2      END;
0000026C  2  DISPOSE(BUFFER);
0000027E  2  END;
00000000  1
00000000  1  PROCEDURE MODIFY_BYTE(A_BYTE_PTR : BYTE_PTR; NUM : BYTE);
00000286  2  BEGIN
00000286  2  A_BYTE_PTR^ := NUM;
0000028E  2  END;
00000000  1
00000000  1  PROCEDURE MODIFY_WORD(A_WORD_PTR : WORD_PTR; NUM : INT);
00000296  2  BEGIN
00000296  2  A_WORD_PTR := WORD_PTR(SHIFT(SHIFT(A_WORD_PTR,-1),+1));
000002A2  2  A_WORD_PTR^ := NUM;
000002AA  2  END;
00000000  1
00000000  1  PROCEDURE MODIFY_LONG(A_LONG_PTR : LONG_PTR; NUM : DOUBLE_WORD);
000002B2  2  BEGIN
000002B2  2  A_LONG_PTR := LONG_PTR(SHIFT(SHIFT(A_LONG_PTR,-1),+1));
000002BE  2  A_LONG_PTR^ := NUM;
000002C6  2  END;
00000000  1
00000000  1  PROCEDURE MODIFY_BLOCK(A_WORD_PTR : WORD_PTR; NUM : INT);
00000000  2  VAR
00000000  2      I : INT;
000002CE  2  BEGIN
000002CE  2  A_WORD_PTR := WORD_PTR(SHIFT(SHIFT(A_WORD_PTR,-1),+1));
000002DA  2  FOR I := 0 TO 127 DO
000002DE  2      BEGIN
000002DE  2      A_WORD_PTR^ := NUM;
000002E6  2      A_WORD_PTR := WORD_PTR(INTEGER(A_WORD_PTR) + 2);
000002F0  2      END;
00000300  2  END;
00000000  1
00000000  1  PROCEDURE EXAMINE_BYTE(A_BYTE_PTR : BYTE_PTR);
00000000  2  VAR
00000000  2      TABLE : VECTOR0_15;
00000020  2      A_COMPLEX_TEMP : COMPLEX_TYPE;
00000028  2      ADD2 : DOUBLE_WORD;
0000002C  2      LINE : VECTOR0_15;
00000308  2  BEGIN
00000308  2  ADD2 := DOUBLE_WORD(ADDR(A_COMPLEX_TEMP));
00000310  2  A_COMPLEX_TEMP.VALUE := DOUBLE_WORD(A_BYTE_PTR);
00000316  2  A_COMPLEX_TEMP.MASK.MSW := INT(A_BYTE_PTR^);
```

```
00000322  2  TABLE[0] := 02002H;
00000328  2  TABLE[1] := SHIFT(SHIFT(ADD2.LSW,+1),-2) + 04000H;
00000338  2  TABLE[2] := 03004H;
0000033E  2  TABLE[3] := SHIFT(SHIFT(ADD2.LSW,+1),-2) + 04001H;
0000034E  2  TABLE[4] := 04003H;
00000354  2  TABLE[5] := 0203DH;
0000035A  2  TABLE[6] := 02020H;
00000360  2  TABLE[7] := 03002H;
00000366  2  TABLE[8] := SHIFT(SHIFT(ADD2.LSW,+1),-2) + 04002H;
00000376  2  TABLE[9] := 06013H;
0000037C  2  TABLE[10] := 0;
00000390  2  P_FORMATTER(TABLE,INTEGER(ADDR(LINE)));
00000396  2  DPC_WRITE(INTEGER(ADDR(LINE)),0FD33H,16);
000003B0  2  END;
00000000  1
00000000  1  PROCEDURE EXAMINE_WORD(A_WORD_PTR : WORD_PTR);
00000000  2  VAR
00000000  2      TABLE : VECTOR0_15;
00000020  2      A_COMPLEX_TEMP : COMPLEX_TYPE;
00000028  2      ADD2 : DOUBLE_WORD;
00000020  2      LINE : VECTOR0_15;
000003B8  2  BEGIN
000003B8  2  A_WORD_PTR := WORD_PTR(SHIFT(SHIFT(A_WORD_PTR,-1),+1));
000003C4  2  ADD2 := DOUBLE_WORD(ADDR(A_COMPLEX_TEMP));
000003CC  2  A_COMPLEX_TEMP.VALUE := DOUBLE_WORD(A_WORD_PTR);
000003D2  2  A_COMPLEX_TEMP.MASK.MSW := A_WORD_PTR^;
000003DA  2  TABLE[0] := 02002H;
000003E0  2  TABLE[1] := SHIFT(SHIFT(ADD2.LSW,+1),-2) + 04000H;
000003F0  2  TABLE[2] := 03004H;
000003F6  2  TABLE[3] := SHIFT(SHIFT(ADD2.LSW,+1),-2) + 04001H;
00000406  2  TABLE[4] := 04003H;
0000040C  2  TABLE[5] := 0203DH;
00000412  2  TABLE[6] := 02020H;
00000418  2  TABLE[7] := 03004H;
0000041E  2  TABLE[8] := SHIFT(SHIFT(ADD2.LSW,+1),-2) + 04002H;
0000042E  2  TABLE[9] := 06011H;
00000434  2  TABLE[10] := 0;
00000438  2  P_FORMATTER(TABLE,INTEGER(ADDR(LINE)));
0000044E  2  DPC_WRITE(INTEGER(ADDR(LINE)),0FD33H,16);
00000468  2  END;
00000000  1
00000000  1  PROCEDURE EXAMINE_LONG(A_LONG_PTR : LONG_PTR);
00000000  2  VAR
00000000  2      TABLE : VECTOR0_15;
00000020  2      A_COMPLEX_TEMP : COMPLEX_TYPE;
00000028  2      ADD2 : DOUBLE_WORD;
00000020  2      LINE : VECTOR0_15;
00000470  2  BEGIN
00000470  2  A_LONG_PTR := LONG_PTR(SHIFT(SHIFT(A_LONG_PTR,-1),+1));
0000047C  2  ADD2 := DOUBLE_WORD(ADDR(A_COMPLEX_TEMP));
00000484  2  A_COMPLEX_TEMP.VALUE := DOUBLE_WORD(A_LONG_PTR);
0000048A  2  A_COMPLEX_TEMP.MASK := A_LONG_PTR^;
00000492  2  TABLE[0] := 02002H;
00000498  2  TABLE[1] := SHIFT(SHIFT(ADD2.LSW,+1),-2) + 04000H;
000004A8  2  TABLE[2] := 03004H;
000004AE  2  TABLE[3] := SHIFT(SHIFT(ADD2.LSW,+1),-2) + 04001H;
000004BE  2  TABLE[4] := 04003H;
000004C4  2  TABLE[5] := 0203DH;
000004CA  2  TABLE[6] := 02020H;
000004D0  2  TABLE[7] := 02004H;
000004D6  2  TABLE[8] := SHIFT(SHIFT(ADD2.LSW,+1),-2) + 04002H;
000004E6  2  TABLE[9] := 03004H;
000004EC  2  TABLE[10] := SHIFT(SHIFT(ADD2.LSW,+1),-2) + 04003H;
000004FC  2  TABLE[11] := 0600DH;
00000502  2  TABLE[12] := 0;
00000506  2  P_FORMATTER(TABLE,INTEGER(ADDR(LINE)));
0000051C  2  DPC_WRITE(INTEGER(ADDR(LINE)),0FD33H,16);
00000536  2  END;
00000000  1
00000000  1  PROCEDURE EXAMINE_BLOCK(A_WORD_PTR : WORD_PTR);
00000000  2  VAR
00000000  2      TABLE : VECTOR0_15;
00000020  2      A_COMPLEX_TEMP : COMPLEX_TYPE;
00000028  2      ADD2 : DOUBLE_WORD;
```

```
0000002C  2       BTEMP : DOUBLE_BYTE;
0000002E  2       TEMP : INTEGER;
00000032  2       TEMP2 : INTEGER;
00000036  2       I : INT;
00000038  2       J : INT;
0000003A  2       SCREEN : INT;
0000003C  2       LINE : VECTOR0_15;
0000005C  2       PAD1 : VECTOR0_15;
0000007C  2       PAD2 : VECTOR0_7;
0000003E  2   BEGIN
0000052E  2   A_WORD_PTR := WORD_PTR(SHIFT(SHIFT(A_WORD_PTR,-1),+1));
0000054A  2   ADD2 := DOUBLE_WORD(ADDR(A_COMPLEX_TEMP));
00000552  2   SCREEN := 0F818H;
00000558  2   FOR I := 1 TO 16 DO
0000055C  2       BEGIN
0000055E  2       TEMP := INTEGER(ADDR(LINE));
00000566  2       A_COMPLEX_TEMP.VALUE := DOUBLE_WORD(A_WORD_PTR);
0000056C  2       TABLE[0] := 02002H;
00000572  2       TABLE[1] := SHIFT(SHIFT(ADD2.LSW,+1),-2) + 04000H;
00000582  2       TABLE[2] := 03004H;
00000588  2       TABLE[3] := SHIFT(SHIFT(ADD2.LSW,+1),-2) + 04001H;
00000598  2       TABLE[4] := 06048H;
0000059E  2       TABLE[5] := 0;
000005A2  2       P_FORMATTER(TABLE,TEMP);
000005B6  2       TEMP := TEMP + 10;
000005BE  2       TEMP2 := TEMP + 50;
000005CC  2       FOR J := 1 TO 8 DO
000005D2  2           BEGIN
000005D2  2           A_COMPLEX_TEMP.MASK.MSW := A_WORD_PTR^;
000005DA  2           TABLE[0] := 02004H;
000005E0  2           TABLE[1] := SHIFT(SHIFT(ADD2.LSW,+1),-2) + 04002H;
000005F0  2           TABLE[2] := 0;
000005F4  2           P_FORMATTER(TABLE,TEMP);
00000608  2           BTEMP := DOUBLE_BYTE(A_WORD_PTR^);
0000061C  2           IF SHIFT(BTEMP.MSB,-7) = 1 THEN
0000062E  2               BTEMP.MSB := 2EH;
00000624  2           IF SHIFT(BTEMP.LSB,-7) = 1 THEN
00000632  2               BTEMP.LSB := 2EH;
00000638  2           A_COMPLEX_TEMP.MASK.MSW := INT(BTEMP);
0000063E  2           TABLE[0] := 04402H;
00000644  2           P_FORMATTER(TABLE,TEMP2);
00000658  2           A_WORD_PTR := WORD_PTR(INTEGER(A_WORD_PTR) + 2);
00000662  2           TEMP := TEMP + 6;
00000666  2           TEMP2 := TEMP2 + 2;
0000066A  2           IF J = 4 THEN
00000676  2               TEMP2 := TEMP2 + 2;
0000067A  2           END;
0000068C  2  {    TEMP := TEMP + 22;         }
0000068C  2       BPC_WRITE(INTEGER(ADDR(LINE)),SCREEN,40);
000006A6  2       SCREEN := SCREEN + 40;
000006AC  2       END;
000006BE  2  END;
00000000  1
00000000  1  .

End of compilation, number of errors=     0
00000000  1  "U8000" PREPROCESS
00000000  1  SENSE_PAGES
00000000  1  $WIDTH 120$
00000000  1
00000000  1  PROGRAM FAS_UTL_;
00000000  1
00000000  1  $EXTENSIONS ON$
00000000  1  $LIB_ABS_LONG$
00000000  1  $WARN OFF$
00000000  1
00000000  1  TYPE
00000000  1      INT = SIGNED_16;
00000000  1      INT_PTR = ^ INT;
00000000  1      PTR = ^ INTEGER;
00000000  1      VECTOR0_7 = ARRAY[0..7] OF INT;
00000000  1      FMGRNAME = ARRAY[0..7] OF INT;
00000000  1      DOUBLE_WORD = RECORD
00000000  2                  LSW : INT;
```

```
00000000  2                 MSW : INT;
00000000  1                 END;
00000000  1      COMPLEX_TYPE = RECORD
00000000  2                 VALUE : DOUBLE_WORD;
00000000  2                 MASK : DOUBLE_WORD;
00000000  1                 END;
00000000  1  #INCLUDE ICMD_DATA:SODAMON
00000000  1  #INCLUDE ISPEC_DATA:SODAMON
00000000  1  #INCLUDE IDATA_BASE:SODAMON
00000000  1
00000000  1  VAR
00000000  1  $EXTVAR+$
00000000  1      CMD_STACK : CMD_ARRAY_PTR;
00000000  1      CMD_STACK_NDX : INT;
00000000  1      SEMANTIC_ERROR : INT;
00000000  1      CONFIGURATION : CONFIG_REC_TYPE;
00000000  1  $EXTVAR-$
00000000  1
00000000  1  $CALL_ABS_LONG ON$
00000000  1  PROCEDURE READ_REG(REG : INT; VAR PC : INTEGER); EXTERNAL;
00000000  1  PROCEDURE OUTIT(LETTER : CHAR; VALUE : INT; BASE : CHAR); EXTERNAL;
00000000  1  PROCEDURE WHICH_FILE(ABS_FILE : PTR; ABS_DISC : INT; VAR ADDRESS, BEGINNING, ENDING : INTEGER;
00000000  2                      SOURCE_NAME : PTR; VAR SOURCE_DISC, RELOCATION, ERROR : INT); EXTERNAL;
00000000  1  PROCEDURE PROC_INIT(SOURCE_NAME : PTR; VAR SOURCE_DISC : INT;
00000000  2                      VAR SOURCE_NO, PROCESSOR, LANGUAGE, ERROR : INT); EXTERNAL;
00000000  1  PROCEDURE FIND_SYM(PPTR : PATH_PTR; SPTR : PTR; VAR SYMTYPE : SYMSET;
00000000  2                      VAR LENGTH,  ERROR : INT); EXTERNAL;
00000000  1  PROCEDURE FIND_LINE_NO(LINE, PROG_NO : INT; VAR ADDRESS : INTEGER;
00000000  2                      VAR ERROR : INT); EXTERNAL;
00000000  1  PROCEDURE LN_HANDLER(PROG_NO : INT; ADDRESS : INTEGER; FIRST_LINE : BOOLEAN;
00000000  2                      VAR ENTRY, EXIT : INTEGER; VAR LINE_NO, ERROR : INT); EXTERNAL;
00000000  1  PROCEDURE LINE_SUB(PROG_NO : INT; VAR ADDRESS : INTEGER;
00000000  2                      VAR SUB_NO, ERROR : INT); EXTERNAL;
00000000  1  PROCEDURE PROG_PNAME(PROG_NO : INT; VAR PROC_NAME : VECTORO_7;
00000000  2                      VAR ERROR : INT); EXTERNAL;
00000000  1  PROCEDURE SUB_NAME(PROG_NO,PROC_NO : INT; VAR PROC_NAME : VECTORO_7;
00000000  2                      VAR ERROR : INT); EXTERNAL;
00000000  1  PROCEDURE P_ADDR(LOGICAL : INTEGER; VAR PHYSICAL : INTEGER); EXTERNAL;
00000000  1  FUNCTION  SUB_INDEX(PROG_NO, CURR_SUB : INT; VAR NEXT_SUB : INT) : INTEGER; EXTERNAL;
00000000  1  PROCEDURE FILE_RANGE(VAR ABS_FILE : VECTORO_7; ABS_DISC : INT; VAR SRC_FILE : VECTORO_7; SRC_DISC : INT;
00000000  2                      VAR START_ADDR, END_ADDR : INTEGER; VAR ERROR : INT); EXTERNAL;
00000000  1  $CALL_PC_SHORT ON$
00000000  1  FUNCTION  BUILD_OFFSET(GEN : GENERIC_PTR; VAR_STACK_PTR : SPECABLE_TYPE_PTR; INDIRECT : BOOLEAN;
00000000  2                      VAR SYMBOL : VECTORO_7; VAR CMD_ELEMENT : CMD_DATA_TYPE) : BOOLEAN; EXTERNAL;
00000000  1  PROCEDURE BUILD_PARENTS(PATH : PATH_PTR; VAR CMD_ELEMENT : CMD_DATA_TYPE); EXTERNAL;
00000000  1  FUNCTION  DB_ERROR(ERROR : INT) : BOOLEAN; EXTERNAL;
00000000  1  PROCEDURE SYMBOL_MESSAGE(MESS_NUM : INT; VAR IDENT : VECTORO_7; MESSAGE : MESSAGE_TYPES); EXTERNAL;
00000000  1  PROCEDURE LINE_MESSAGE(MESS_NUM : INT; LINE : INT; MESSAGE : MESSAGE_TYPES); EXTERNAL;
00000000  1  PROCEDURE SYSTEM_MESSAGE(MESS_NUM, MESS_CODE : INT; MESSAGE : MESSAGE_TYPES); EXTERNAL;
00000000  1  PROCEDURE GENERAL_MESSAGE(MESS_NUM : INT; MESSAGE_CODE : MESSAGE_TYPES); EXTERNAL;
00000000  1  PROCEDURE FILE_MESSAGE(MESS_NUM : INT; FILE_NAME : VECTORO_7; FILE_DISC : INT;
00000000  2                      MESSAGE_CODE : MESSAGE_TYPES); EXTERNAL;
00000000  1
00000000  1  $GLOBPROC+$
00000000  1
00000000  1  PROCEDURE ADD_CMD_DATA(VAR DATA : CMD_DATA_TYPE);
00000004  2  BEGIN
00000004  2  IF CMD_STACK_NDX <= MAX_DATA_INDEX THEN
00000010  2     BEGIN
00000010  2     CMD_STACK^[CMD_STACK_NDX] := DATA;
00000028  2     CMD_STACK_NDX := CMD_STACK_NDX + 1;
0000002C  2     END
00000030  2  ELSE
00000036  2     GENERAL_MESSAGE(18,Error);
0000003E  2  END;
00000000  1
00000000  1  PROCEDURE BUILD_OP(OPCODE : OP_CODES; VAR CMD_ELEMENT : CMD_DATA_TYPE);
00000000  2  VAR
00000000  2     I : INT;
00000046  2  BEGIN
00000046  2  CMD_ELEMENT.OP_CODE := OPCODE;
0000004E  2  WITH CMD_ELEMENT DO
00000056  2     FOR I := 0 TO 38 DO
0000005A  2        DUMMY1[I] := 0;
```

```
0000007C  2  END;
00000000  1
00000000  1  PROCEDURE BUILD_VAR(PATH : PATH_PTR; VAR SYM_DESC : SYM_DESC_TYPE;
00000000  2                   SYMBOL : INT_PTR; LENGTH : INT;
00000000  2                   VAR_STACK : SPECABLE_TYPE_PTR;
00000000  2                   VAR CMD_ELEMENT, CMD_ATEMP : CMD_DATA_TYPE);
00000000  2  LABEL 1;
00000000  2  VAR
00000000  2     I : INT;
00000002  2     NEW_SYMBOL : SMALL_SYMBUFF_PTR;
00000006  2     ERROR : INT;
00000008  2     FLAG : BOOLEAN;
00000009  2     GEN : GENERIC_PTR;
00000084  2  BEGIN
00000084  2  GEN.GENERIC := INTEGER(SYMBOL);
0000008A  2  CMD_ELEMENT.OP_CODE := VAR_OP;
00000092  2  WITH GEN DO
0000009A  2  WITH CMD_ELEMENT DO
000000A2  2     BEGIN
000000A2  2     DB_PTR := INTEGER(SYMBOL);
000000AB  2     DB_LENGTH := LENGTH;
000000B2  2     LANGUAGE := SYM_DESC.LANGUAGE;
000000C0  2     FILE_NUM := PATH^.PROG_NUM;
000000CE  2     FILE_NAME := SYM_DESC.FILE_NAME;
000000E6  2     DISC_NUM := SYM_DESC.FILE_DISC;
000000F4  2     PROC_NUM := PATH^.PROC_NUM;
00000102  2     IF PROC_NUM <> 0 THEN
0000010E  2         PROC_NAME := SYM_DESC.PROC_NAME
00000126  2     ELSE
00000126  2         PROC_NAME[0] := 0020H;
00000132  2     FLAGS := VARIABLE^.FLAGS;
00000142  2     STATUS := 0;
00000144  2     LINE1 := 0;
00000152  2     LINE2 := 0;
0000015A  2     FLAG := (SYM_DESC.SYMBOL_TYPE = Parm) AND (SHIFT(SHIFT(FLAGS,+11),-15) = 1), {paramater passed by name}
00000190  2     IF NOT BUILD_OFFSET(GEN,VAR_STACK,FLAG,PATH^.SYM,CMD_ATEMP) THEN
000001B4  2         GOTO 1, {error trapped}
000001B8  2     I := 0;
000001BC  2     WHILE CMD_ATEMP.SIZES[I] <> -1 DO
000001D8  2         I := I + 1;
000001DE  2     IF CMD_ATEMP.SIZES[I - 1] = 0 THEN
000001F6  2         BEGIN
000001F6  2         SYMBOL_MESSAGE(10,VARIABLE^.NAME,Error);
0000020E  2         GOTO 1; {error trapped}
00000212  2         END;
00000212  2     IF I = 1 THEN  {only one entry}
0000021E  2         BEGIN
0000021E  2         ADDRESS := CMD_ATEMP.OFFSETS[0];
0000022E  2         SIZE := CMD_ATEMP.SIZES[0];
0000023E  2         CMD_ATEMP.OFFSETS[0] := -1;
0000024C  2         CMD_ATEMP.SIZES[0] := -1;
0000025A  2         END
0000025E  2     ELSE BEGIN
0000025E  2         ADDRESS := -1;
0000026A  2         SIZE := -1;
00000276  2         END;
00000276  2     IF (SYM_DESC.SYMBOL_TYPE = Parm) OR (SHIFT(SHIFT(FLAGS,+12),-15) = 1) THEN {paramater or dynamic}
000002AC  2         BEGIN
000002AC  2         NEW(NEW_SYMBOL);
000002BE  2         LENGTH := SMALL_SYMBUFF_SIZE;
000002C4  2         SYMBOL := INT_PTR(NEW_SYMBOL);
000002CA  2         PATH^.SYM := SYM_DESC.PROC_NAME;
000002DE  2         PATH^.PROC_NUM := 0;
000002E6  2         FIND_SYM(PATH,SYMBOL,SYM_DESC.SYMBOL_TYPE,LENGTH,ERROR);
0000030A  2         IF DB_ERROR(ERROR) THEN
0000031A  2             IF ERROR = 12 THEN
00000326  2                 SYMBOL_MESSAGE(4,SYM_DESC.PROC_NAME,Error)
00000340  2             ELSE
00000340  2                 SYSTEM_MESSAGE(321,ERROR,Error);
00000352  2         GENERIC := INTEGER(SYMBOL);
0000035A  2         ENTRY := PROC^.ENTRY;
0000036A  2         EXIT := PROC^.EXIT;
0000037A  2         ENTRY_OFFSET := PROC^.ENTRY_OFFSET;
0000038A  2         EXIT_OFFSET := PROC^.EXIT_OFFSET;
```

```
0000039A  2          DISPOSE(NEW_SYMBOL);
000003AC  2          END
000003B0  2      ELSE BEGIN                              {static}
000003D0  2          ENTRY := -1;
000003DC  2          EXIT := -1;
000003C8  2          ENTRY_OFFSET := 0;
000003D0  2          EXIT_OFFSET := 0;
000003D8  2          END;
000003D8  2      DUMMY2[0] := 0;
000003E2  2      DUMMY2[1] := 0;
000003EE  2  1 : END;
000003EE  2  END;
00000000  1
00000000  1  PROCEDURE BUILD_MOD(PATH : PATH_PTR; VAR SYM_DESC : SYM_DESC_TYPE;
00000000  2                  SYMBOL : INT_PTR; LENGTH : INT;
00000000  2                  VAR CMD_ELEMENT, CMD_ATEMP : CMD_DATA_TYPE);
00000000  2  LABEL 1;
00000000  2  VAR
00000000  2      I : INT;
00000002  2      ERROR : INT;
00000004  2      TEMP_ADDRESS : INTEGER;     {to fix a compiler/database bug}
00000008  2      PHYSICAL : INTEGER;
0000000C  2      LINE_ENTRY : INTEGER;
00000010  2      LINE_EXIT : INTEGER;
00000014  2      GEN : GENERIC_PTR;
000003F6  2  BEGIN
000003F6  2  GEN.GENERIC := INTEGER(SYMBOL);
000003FC  2  CMD_ELEMENT.OP_CODE := PROC_OP;
00000404  2  WITH GEN DO
0000040C  2  WITH CMD_ELEMENT DO
00000414  2      BEGIN
00000414  2      DB_PTR := 0;                 {INTEGER(SYMBOL);}
00000418  2      DB_LENGTH := 0;              {LENGTH;}
00000420  2      LANGUAGE := SYM_DESC.LANGUAGE;
0000042E  2      FILE_NUM := PATH^.PROG_NUM;
0000043C  2      FILE_NAME := SYM_DESC.FILE_NAME;
00000454  2      DISC_NUM := SYM_DESC.FILE_DISC;
00000462  2      PROC_NUM := PATH^.PROC_NUM;
00000470  2      PROC_NAME := SYM_DESC.SYMBOL_NAME;
00000484  2      STATUS := 01006;             {op_code fetch}
0000048E  2      IF SYM_DESC.SYMBOL_TYPE = Proc THEN
0000049A  2          BEGIN
0000049A  2          FLAGS := 0;
000004A2  2          ADDRESS := PROC^.ENTRY;
000004B2  2          SIZE := PROC^.EXIT - PROC^.ENTRY + 1;
000004CC  2          ENTRY := PROC^.ENTRY;
000004DC  2          EXIT := PROC^.EXIT;
000004EC  2          ENTRY_OFFSET := 0;
000004F4  2          EXIT_OFFSET := 0;
000004FC  2          END
00000500  2      ELSE BEGIN
00000500  2          FLAGS := PROC^.FLAGS;
00000510  2          ADDRESS := PROC^.ENTRY;
00000520  2  {        SIZE := PROC^.EXIT - PROC^.ENTRY + 1;  }
00000520  2          SIZE := PROC^.E_LABEL - PROC^.ENTRY + 1;
0000053A  2          ENTRY := PROC^.ENTRY;
0000054A  2          EXIT := PROC^.EXIT;
0000055A  2          ENTRY_OFFSET := PROC^.ENTRY_OFFSET;
0000056A  2          EXIT_OFFSET := PROC^.EXIT_OFFSET;
0000057A  2          END;
0000057A  2      BUILD_PARENTS(PATH,CMD_ATEMP);
0000058A  2      IF ENTRY = EXIT THEN
0000059A  2          SYMBOL_MESSAGE(17,SYM_DESC.PROC_NAME,Error);
000005B0  2      TEMP_ADDRESS := ENTRY;
000005BA  2      ERROR := -1;
000005C0  2      IF SEMANTIC_ERROR <> 0 THEN
000005C8  2          GOTO 1; {error trapped}
000005CC  2      WHILE ERROR <> 0 DO                          { This fix is  }
000005D4  2          BEGIN                                    { get around   }
000005D4  2          P_ADDR(TEMP_ADDRESS,PHYSICAL);
000005E4  2          LN_HANDLER(FILE_NUM,PHYSICAL,TRUE,LINE_ENTRY,LINE_EXIT,LINE1,ERROR); { the fact     }
00000610  2          IF DB_ERROR(ERROR) THEN                  { that there   }
00000620  2              IF ERROR = 12 THEN                   { is no line   }
0000062C  2                  BEGIN                            { number       }
```

```
00000620  2              TEMP_ADDRESS := TEMP_ADDRESS + 2;    { associated   }
00000630  2              SEMANTIC_ERROR := 0; {reset}         { with the     }
00000634  2              END                                  { procedure    }
00000638  2           ELSE BEGIN                              { entry point  }
00000638  2              SYSTEM_MESSAGE(331,ERROR,Error);
0000064A  2              GOTO 1; {error trapped}
0000064E  2              END;
0000064E  2        END;
00000652  2     FIND_LINE_NO(LINE1,FILE_NUM,TEMP_ADDRESS,ERROR); { This fix is get }
00000672  2     IF DB_ERROR(ERROR) THEN                          { around the fact }
00000682  2        IF ERROR = 12 THEN                            { that the entry  }
0000068E  2           SEMANTIC_ERROR := 0                        { address and the }
00000696  2        ELSE BEGIN                                    { first line      }
00000696  2           SYSTEM_MESSAGE(332,ERROR,Error);
000006A8  2           GOTO 1; {error trapped}
000006AC  2           END;
000006AC  2     WHILE TEMP_ADDRESS < ENTRY DO                    { address are not }
000006BC  2        BEGIN                                         { the same, i.e.  }
000006BC  2        LINE1 := LINE1 + 1;                           { a compiler bug. }
000006C6  2        FIND_LINE_NO(LINE1,FILE_NUM,TEMP_ADDRESS,ERROR);
000006E6  2        IF DB_ERROR(ERROR) THEN                       { Note: the       }
000006F6  2           IF ERROR = 12 THEN                         { compiler people }
00000702  2              BEGIN
00000702  2              SEMANTIC_ERROR := 0;                    { will not fix    }
00000706  2              TEMP_ADDRESS := 0;
0000070A  2              END
0000070E  2           ELSE BEGIN                                 { this bug.       }
0000070E  2              SYSTEM_MESSAGE(333,ERROR,Error);
00000720  2              GOTO 1; {error trapped}
00000724  2              END;
00000724  2        END;                                          {                 }
00000726  2     P_ADDR(EXIT,PHYSICAL);
0000073A  2     LN_HANDLER(FILE_NUM,PHYSICAL,FALSE,LINE_ENTRY,LINE_EXIT,LINE2,ERROR);
00000764  2     IF DB_ERROR(ERROR) THEN
00000774  2        BEGIN
00000774  2        SYSTEM_MESSAGE(334,ERROR,Error);
00000786  2        GOTO 1; {error trapped}
0000078A  2        END;
0000078A  2     DUMMY2[0] := 0;
00000794  2     DUMMY2[1] := 0;
000007A0  2  1 : END;
000007A0  2  END;
00000000  1
00000000  1  PROCEDURE BUILD_LINE(VAR SYM_DESC : SYM_DESC_TYPE; LINE_1, LINE_2 : INT;
00000000  2                    VAR CMD_ELEMENT, CMD_ATEMP : CMD_DATA_TYPE);
00000000  2  LABEL 1, 2;
00000000  2  VAR
00000000  2     I : INT;
00000002  2     ADDRESS1 : INTEGER;
00000006  2     ADDRESS2 : INTEGER;
0000000A  2     PHYSICAL : INTEGER;
0000000E  2     ERROR : INT;
00000010  2     SYMBOL : SMALL_SYMBUFF_PTR;
00000014  2     PATH : PATH_PTR;
00000018  2     SYMBOL_TYPE : SYMSET;
00000019  2     LENGTH : INT;
0000001C  2     PROC1 : INT;
0000001E  2     PROC2 : INT;
00000020  2     GEN : GENERIC_PTR;
000007A8  2  BEGIN
000007A8  2  CMD_ELEMENT.OP_CODE := LINE_OP;
000007B0  2  WITH CMD_ELEMENT DO
000007B8  2     BEGIN
000007B8  2     LANGUAGE := SYM_DESC.LANGUAGE;
000007C2  2     FILE_NUM := SYM_DESC.FILE_NUM;
000007D0  2     DISC_NUM := SYM_DESC.FILE_DISC;
000007DE  2     STATUS := 0100B;             {op_code fetch}
000007E8  2     LINE1 := LINE_1;
000007F2  2     LINE2 := LINE_2;
000007FC  2     FILE_NAME := SYM_DESC.FILE_NAME;
00000814  2     FIND_LINE_NO(LINE_1,SYM_DESC.FILE_NUM,ADDRESS1,ERROR);
00000834  2     IF DB_ERROR(ERROR) THEN
00000844  2        BEGIN
00000844  2        IF ERROR = 12 THEN
```

```
00000850  2                  LINE_MESSAGE(21,LINE_1,Error)
00000866  2              ELSE
00000866  2                  SYSTEM_MESSAGE(341,ERROR,Error);
00000878  2              GOTO 1; {error trapped}
0000087C  2              END;
0000087C  2         IF LINE_2 <> -1 THEN
00000883  2              BEGIN
00000888  2              FIND_LINE_NO(LINE_2,SYM_DESC.FILE_NUM,ADDRESS2,ERROR);
000008A6  2              IF DB_ERROR(ERROR) THEN
000008A6  2                  BEGIN
000008A6  2                  IF ERROR = 12 THEN
000008C2  2                       LINE_MESSAGE(21,LINE_2,Error)
000008D8  2                  ELSE
000008D8  2                       SYSTEM_MESSAGE(342,ERROR,Error);
000008EA  2                  GOTO 1; {error trapped}
000008EE  2                  END;
000008EE  2              IF ADDRESS1 = ADDRESS2 THEN
000008FA  2                  BEGIN
000008FA  2                  SEMANTIC_ERROR := 19;
00000900  2                  GOTO 1; {error trapped}
00000904  2                  END;
00000904  2              END
00000908  2         ELSE
00000908  2              ADDRESS2 := ADDRESS1 + 4; {fudge so a single line has size}
00000912  2         P_ADDR(ADDRESS1,PHYSICAL);
00000922  2         LINE_SUB(SYM_DESC.FILE_NUM,PHYSICAL,PROC1,ERROR);
00000942  2         IF DB_ERROR(ERROR) THEN
00000952  2              BEGIN
00000952  2              SYSTEM_MESSAGE(343,ERROR,Error);
00000964  2              GOTO 1; {error trapped}
00000968  2              END;
00000968  2         IF LINE_2 <> -1 THEN
00000974  2              BEGIN
00000974  2              P_ADDR(ADDRESS2,PHYSICAL);
00000984  2              LINE_SUB(SYM_DESC.FILE_NUM,PHYSICAL,PROC2,ERROR);
000009A4  2              IF DB_ERROR(ERROR) THEN
000009B4  2                  BEGIN
000009B4  2                  SYSTEM_MESSAGE(344,ERROR,Error);
000009C6  2                  GOTO 1; {error trapped}
000009CA  2                  END;
000009CA  2              IF PROC1 <> PROC2 THEN
000009D6  2                  BEGIN
000009D6  2                  SEMANTIC_ERROR := 20;
000009DC  2                  GOTO 1; {error trapped}
000009E0  2                  END;
000009E0  2              END;
000009E0  2         IF ERROR = 0 THEN
000009E8  2         IF PROC1 = 0 THEN
000009F0  2              PROG_PNAME(SYM_DESC.FILE_NUM,PROC_NAME,ERROR)
00000A14  2         ELSE
00000A14  2              SUB_NAME(SYM_DESC.FILE_NUM,PROC1,PROC_NAME,ERROR);
00000A38  2         IF DB_ERROR(ERROR) THEN
00000A48  2              BEGIN
00000A48  2              SYSTEM_MESSAGE(345,ERROR,Error);
00000A5A  2              GOTO 1; {error trapped}
00000A5E  2              END;
00000A5E  2         NEW(SYMBOL);
00000A70  2         NEW(PATH);
00000A82  2         LENGTH := SMALL_SYMBUFF_SIZE;
00000A88  2         PATH^.SYM := PROC_NAME;
00000A9C  2         PATH^.PROC_NUM := 0 {PROC1};
00000AA4  2         PATH^.PROG_NUM := SYM_DESC.FILE_NUM;
00000AB2  2         FIND_SYM(PATH,PTR(SYMBOL),SYMBOL_TYPE,LENGTH,ERROR);
00000AD2  2         IF DB_ERROR(ERROR) THEN
00000AE2  2              BEGIN
00000AE2  2              IF ERROR = 12 THEN
00000AEE  2                  SYMBOL_MESSAGE(4,PROC_NAME,Error)
00000B08  2              ELSE
00000B08  2                  SYSTEM_MESSAGE(346,ERROR,Error);
00000B1A  2              GOTO 2; {error trapped}
00000B1E  2              END;
00000B1E  2         GEN.GENERIC := INTEGER(SYMBOL);
00000B24  2         IF PROC1 = 0 THEN
00000B2C  2              BEGIN
```

```
0000082C  2          FLAGS := 0;
00000834  2          ENTRY := GEN.PROG^.ENTRY;
00000842  2          EXIT := GEN.PROG^.EXIT;
00000850  2          ENTRY_OFFSET := 0;
00000858  2          EXIT_OFFSET := 0;
00000860  2          END
00000864  2      ELSE BEGIN
00000864  2          FLAGS := GEN.PROC^.FLAGS;
00000872  2          ENTRY := GEN.PROC^.ENTRY;
00000880  2          EXIT := GEN.PROC^.EXIT;
0000088E  2          ENTRY_OFFSET := GEN.PROC^.ENTRY_OFFSET;
0000089C  2          EXIT_OFFSET := GEN.PROC^.EXIT_OFFSET;
00000BAA  2          END;
00000BAA  2      PATH^.PROC_NUM := PROC1;
00000BB4  2      BUILD_PARENTS(PATH,CMD_ATEMP);
00000BC4  2      PROC_NUM := PROC1;
00000BCE  2      ADDRESS := ADDRESS1;
00000BD8  2      SIZE := ADDRESS2 - ADDRESS1;
00000BE8  2      DB_PTR := 0; {INTEGER(SYMBOL);}
00000BF0  2      DB_LENGTH := 0; {LENGTH}
00000BF8  2      DUMMYZ[0] := 0;
00000C02  2      DUMMYZ[1] := 0;
00000C0E  2  2 : DISPOSE(PATH);
00000C20  2      DISPOSE(SYMBOL);
00000C32  2  1 : END;
00000C32  2  END;
00000000  1
00000000  1  PROCEDURE BUILD_LINES(CMD_ELEMENT : CMD_DATA_TYPE);
00000000  2  LABEL 1;
00000000  2  VAR
00000000  2      LINE_1 : INT;
00000002  2      LINE_2 : INT;
00000004  2      PROG_NO : INT;
00000006  2      LINE : INT;
00000008  2      I : INT;
0000000A  2      THIS_ADDRESS : INTEGER;
0000000E  2      ERROR : INT;
00000C4A  2  BEGIN
00000C4A  2  WITH CMD_ELEMENT DO
00000C52  2      BEGIN
00000C52  2      PROG_NO := FILE_NUM;
00000C58  2      LINE_1 := LINE1;
00000C5E  2      LINE_2 := LINE2;
00000C64  2      END;
00000C64  2  IF LINE_2 - LINE_1 > 255 THEN
00000C74  2      BEGIN
00000C74  2      SEMANTIC_ERROR := 28;
00000C7A  2      GOTO 1; {error trapped}
00000C7E  2      END;
00000C7E  2  IF CMD_ELEMENT.SIZE > 4096 THEN
00000C90  2      BEGIN
00000C90  2      SEMANTIC_ERROR := 29;
00000C96  2      GOTO 1; {error trapped}
00000C9A  2      END;
00000C9A  2  CMD_ELEMENT.OP_CODE := LINES;
00000CA0  2  WITH CMD_ELEMENT DO
00000CA8  2      BEGIN
00000CA8  2      DUMMY6 := -1;
00000CAE  2      FOR I := 0 TO 18 DO
00000CB2  2          ADDRS[I] := -1;
00000CD8  2      I := 0;
00000CDC  2      FOR LINE := LINE_1 TO LINE_2 - 1 DO
00000CF4  2          BEGIN
00000CF4  2          FIND_LINE_NO(LINE,PROG_NO,THIS_ADDRESS,ERROR);
00000D10  2          IF DB_ERROR(ERROR) THEN
00000D20  2              IF ERROR = 12 THEN             {line not found}
00000D2C  2                  SEMANTIC_ERROR := 0        {not an error}
00000D34  2              ELSE BEGIN
00000D34  2                  SYSTEM_MESSAGE(351,ERROR,Error);
00000D46  2                  GOTO 1; {error trapped}
00000D4A  2                  END
00000D4E  2          ELSE BEGIN
00000D4E  2              ADDRS[I] := THIS_ADDRESS;
00000D62  2              I := I + 1;
```

```
00000D66  2              END;
00000D66  2          IF I > 18 THEN
00000D72  2              BEGIN
00000D72  2              ADD_CMD_DATA(CMD_ELEMENT);
00000D7C  2              DUMMY6 := -1;
00000D86  2              FOR I := 0 TO 18 DO
00000D8A  2                  ADDRS[I] := -1;
00000DB0  2              I := 0;
00000DB4  2              END;
00000DB4  2          END;
00000DC8  2      IF I <> 0 THEN
00000DD0  2          ADD_CMD_DATA(CMD_ELEMENT);
00000DDA  2  1 : END;
00000DDA  2  END;
00000000  1
00000000  1  PROCEDURE BUILD_VALUE(VALUE : INTEGER; REL_OP : INT; VAR CMD_ELEMENT : CMD_DATA_TYPE);
00000000  2  VAR
00000000  2      I : INT;
00000DE2  2  BEGIN
00000DE2  2  CMD_ELEMENT.OP_CODE := VALUE_OP;
00000DEA  2  CMD_ELEMENT.VAL_VALUE := VALUE;
00000DF4  2  CMD_ELEMENT.REL_OP := REL_OP;
00000DFE  2  FOR I := 0 TO 35 DO
00000E02  2      CMD_ELEMENT.DUMMY7[I] := -1;
00000E26  2  END;
00000000  1
00000000  1  PROCEDURE BUILD_PROCS(VAR SYM_DESC : SYM_DESC_TYPE; VAR CMD_ELEMENT : CMD_DATA_TYPE);
00000000  2  LABEL 1;
00000000  2  VAR
00000000  2      SYMBOL : SMALL_SYMBUFF_PTR;
00000004  2      PATH : PATH_PTR;
00000008  2      LENGTH : INT;
0000000A  2      SYMBOL_TYPE : SYMSET;
0000000B  2      I : INT;
0000000E  2      DONE : BOOLEAN;
0000000F  2      FIRST_SUB : INT;
00000012  2      CURR_SUB : INT;
00000014  2      NEXT_SUB : INT;
00000016  2      ERROR : INT;
00000018  2      GEN : GENERIC_PTR;
0000001C  2      TEMP : INTEGER;
00000020  2      COUNT : INT;
00000E2E  2  BEGIN
00000E2E  2  NEW(SYMBOL);
00000E40  2  NEW(PATH);
00000E52  2  CMD_ELEMENT.OP_CODE := FILE_OP;
00000E5A  2  WITH CMD_ELEMENT DO
00000E62  2      BEGIN
00000E62  2      PROC_NUM := 0;
00000E66  2      LANGUAGE := SYM_DESC.LANGUAGE;
00000E74  2      FILE_NUM := SYM_DESC.FILE_NUM;
00000E82  2      DISC_NUM := SYM_DESC.FILE_DISC;
00000E90  2      FLAGS := 0;
00000E98  2      STATUS := 0100B;           {op_code fetch}
00000EA2  2      LINE1 := 0;
00000EAA  2      LINE2 := 0;
00000EB2  2      PROC_NAME[0] := 0020H;
00000EBE  2      FILE_NAME := SYM_DESC.FILE_NAME;
00000ED6  2      FILE_RANGE(CONFIGURATION.ABS_FILE,CONFIGURATION.ABS_DISC,FILE_NAME,DISC_NUM,ENTRY,EXIT,ERROR);
00000F02  2      IF DB_ERROR(ERROR) THEN
00000F12  2          BEGIN
00000F12  2          IF ERROR = 12 THEN
00000F1E  2              FILE_MESSAGE(60,SYM_DESC.FILE_NAME,SYM_DESC.FILE_DISC,Error)
00000F40  2          ELSE
00000F40  2              SYSTEM_MESSAGE(373,ERROR,Error);
00000F52  2          GOTO 1; {error trapped}
00000F56  2          END;
00000F56  2      ADDRESS := ENTRY;
00000F60  2      SIZE := EXIT - ENTRY + 1;
00000F72  2      DB_PTR := 0;
00000F7A  2      DB_LENGTH := 0;
00000F82  2      DUMMY2[0] := 0;
00000F8C  2      DUMMY2[1] := 0;
00000F98  2      ENTRY_OFFSET := 0;
```

```
00000FA0  2      EXIT_OFFSET := 0;
00000FA8  2      ADD_CMD_DATA(CMD_ELEMENT);
00000FB4  2      OP_CODE := PROC3;
00000FBC  2      TEMP := SUB_INDEX(SYM_DESC.FILE_NUM,0,NEXT_SUB);
00000FD5  2      IF NEXT_SUB = 0 THEN
00000FDE  2          BEGIN
00000FDE  2          FILE_MESSAGE(59,SYM_DESC.FILE_NAME,SYM_DESC.FILE_DISC,Error);
00000FFC  2          GOTO 1; {error trapped}
00001000  2          END;
00001000  2      CURR_SUB := NEXT_SUB;
00001006  2      FIRST_SUB := NEXT_SUB;
0000100C  2      FOR I := 0 TO 2 DO
00001019  2          DUMMY8[I] := -1;
00001034  2      FOR I := 0 TO 8 DO
00001038  2          BEGIN
00001038  2          ENTRYS[I] := -1;
0000104E  2          EXITS[I] := -1;
00001064  2          END;
00001074  2      I := 0;
00001078  2      COUNT := 0;
0000107C  2      DONE := FALSE;
00001080  2      WHILE NOT DONE DO
00001088  2          BEGIN
00001088  2          IF SUB_INDEX(SYM_DESC.FILE_NUM,CURR_SUB,NEXT_SUB) <> 0 THEN
000010A6  2              BEGIN
000010A6  2              SUB_NAME(SYM_DESC.FILE_NUM,CURR_SUB,SYM_DESC.PROC_NAME,ERROR);
000010C6  2              IF DD_ERROR(ERROR) THEN
000010D6  2                  BEGIN
000010D6  2                  SYSTEM_MESSAGE(371,ERROR,Error);
000010E3  2                  GOTO 1; {error trapped}
000010EC  2                  END;
000010EC  2              LENGTH := SMALL_SYMBUFF_SIZE;
000010F2  2              PATH^.SYM := SYM_DESC.PROC_NAME;
00001106  2              PATH^.PROC_NUM := 0;
0000110E  2              PATH^.PROG_NUM := SYM_DESC.FILE_NUM;
0000111C  2              FIND_SYM(PATH,PTR(SYMBOL),SYMBOL_TYPE,LENGTH,ERROR);
0000113C  2              IF DD_ERROR(ERROR) THEN
0000114C  2                  BEGIN
0000114C  2                  SYSTEM_MESSAGE(372,ERROR,Error);
0000115E  2                  GOTO 1; {error trapped}
00001162  2                  END;
00001162  2              GEN.GENERIC := INTEGER(SYMBOL);
00001168  2              ENTRYS[I] := GEN.PROC^.ENTRY;
00001180  2              EXITS[I] := GEN.PROC^.EXIT;
00001198  2              I := I + 1;
0000119C  2              COUNT := COUNT + 1;
000011A0  2              IF COUNT > 255 THEN
000011AC  2                  BEGIN
000011AC  2                  FILE_MESSAGE(34,SYM_DESC.FILE_NAME,SYM_DESC.FILE_DISC,Error);
000011CA  2                  DONE := TRUE;
000011D0  2                  END;
000011D0  2              IF I > 8 THEN
000011DC  2                  BEGIN
000011DC  2                  ADD_CMD_DATA(CMD_ELEMENT);
000011E8  2                  FOR I := 0 TO 2 DO
000011EC  2                      DUMMY8[I] := -1;
00001210  2                  FOR I := 0 TO 8 DO
00001214  2                      BEGIN
00001214  2                      ENTRYS[I] := -1;
0000122A  2                      EXITS[I] := -1;
00001240  2                      END;
00001250  2                  I := 0;
00001254  2                  END;
00001254  2              IF NEXT_SUB = FIRST_SUB THEN
00001260  2                  DONE := TRUE
00001268  2              ELSE
0000126A  2                  CURR_SUB := NEXT_SUB;
00001270  2              END
00001274  2          ELSE
00001274  2              DONE := TRUE;
0000127A  2          END;
0000127E  2      IF I <> 0 THEN
00001286  2          ADD_CMD_DATA(CMD_ELEMENT);
00001292  2      END;
```

```
00001292  2  1:
00001292  2  DISPOSE(PATH);
000012A4  2  DISPOSE(SYMBOL);
000012B6  2  END;
00000000  1
00000000  1  PROCEDURE BUILD_CONTEXT(PC : INTEGER; VAR PROC, PARENTS : CMD_DATA_TYPE; VAR ERROR : INT);
00000000  2  LABEL 1;
00000000  2  VAR
00000000  2      PATH : PATH_PTR;
00000004  2      SYM_DESC : SYM_DESC_TYPE;
00000044  2      TEMP : INT;
00000046  2      LENGTH : INT;
00000048  2      LONG_TEMP : INTEGER;
0000004C  2      SYMBOL : SMALL_SYMBUFF_PTR;
00000050  2      PHYSICAL : INTEGER;
00000054  2     I : INT;
000012BE  2  BEGIN
000012BE  2  NEW(PATH);
000012D0  2  NEW(SYMBOL);
000012E2  2  P_ADDR(PC,PHYSICAL);
000012F2  2  WHICH_FILE(PTR(ADDR(CONFIGURATION.ABS_FILE)),CONFIGURATION.ABS_DISC,
000012F2  2            PHYSICAL,LONG_TEMP,LONG_TEMP,PTR(ADDR(SYM_DESC.FILE_NAME)),SYM_DESC.FILE_DISC,TEMP,ERROR);
00001328  2  IF DB_ERROR(ERROR) THEN
0000133A  2      BEGIN
0000133A  2      SYSTEM_MESSAGE(361,ERROR,Error);
0000134E  2      GOTO 1; {error trapped}
00001352  2      END;
00001352  2  PROG_INIT(PTR(ADDR(SYM_DESC.FILE_NAME)),SYM_DESC.FILE_DISC,SYM_DESC.FILE_NUM,TEMP,SYM_DESC.LANGUAGE,ERROR);
0000137A  2  IF DB_ERROR(ERROR) THEN
0000138C  2      BEGIN
0000138C  2      GENERAL_MESSAGE(48,Error);
0000139A  2      GOTO 1; {error trapped}
0000139E  2      END;
0000139E  2  P_ADDR(PC,PHYSICAL);
000013AE  2  LINE_SUB(SYM_DESC.FILE_NUM,PHYSICAL,SYM_DESC.PROC_NUM,ERROR);
000013CC  2  IF DB_ERROR(ERROR) THEN
000013DE  2      BEGIN
000013DE  2      SYSTEM_MESSAGE(363,ERROR,Error);
000013F2  2      GOTO 1; {error trapped}
000013F6  2      END;
000013F6  2  IF SYM_DESC.PROC_NUM = 0 THEN
000013FE  2      PROG_PNAME(SYM_DESC.FILE_NUM,SYM_DESC.SYMBOL_NAME,ERROR)
0000141C  2  ELSE
0000141C  2      SUB_NAME(SYM_DESC.FILE_NUM,SYM_DESC.PROC_NUM,SYM_DESC.SYMBOL_NAME,ERROR);
0000143A  2  IF DB_ERROR(ERROR) THEN
0000144C  2      BEGIN
0000144C  2      SYSTEM_MESSAGE(364,ERROR,Error);
00001460  2      GOTO 1; {error trapped}
00001464  2      END;
00001464  2  PATH^.SYM := SYM_DESC.SYMBOL_NAME;
00001474  2  PATH^.PROC_NUM := 0;
0000147C  2  PATH^.PROG_NUM := SYM_DESC.FILE_NUM;
00001486  2  LENGTH := SMALL_SYMBUFF_SIZE;
0000148C  2  FIND_SYM(PATH,PTR(SYMBOL),SYM_DESC.SYMBOL_TYPE,LENGTH,ERROR);
000014AE  2  IF DB_ERROR(ERROR) THEN
000014C0  2      BEGIN
000014C0  2      SYSTEM_MESSAGE(365,ERROR,Error);
000014D4  2      GOTO 1; {error trapped}
000014D8  2      END;
000014D8  2  LENGTH := SMALL_SYMBUFF_SIZE;
000014DE  2  PATH^.PROC_NUM := SYM_DESC.PROC_NUM;
000014E8  2  BUILD_MOD(PATH,SYM_DESC,PTR(SYMBOL),LENGTH,PROC,PARENTS);
0000150E  2  1 :
0000150E  2  DISPOSE(SYMBOL);
00001520  2  DISPOSE(PATH);
00001532  2  {
00001532  2  IF ERROR <> 0 THEN
00001532  2      QUIT('E',ERROR,'H');
00001532  2  }
00001532  2  END;
00000000  1
00000000  1  PROCEDURE ADD_ACCESS(ACCESS : INT);
0000153A  2  BEGIN
0000153A  2  CMD_STACK^[CMD_STACK_NDX - 1].STATUS := ACCESS;
```

```
00001552  2  END;
00000000  1  .

****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.
****WARNING ?? - Symbol: LABEL_1, is duplicated in the asmb_sym file.

End of compilation, number of errors=    0
00000000  1  "56000" PREPROCESS
00000000  1  $BASE_PAGES
00000000  1  $WIDTH 120$
00000000  1
00000000  1  PROGRAM POST_PROC_;
00000000  1
00000000  1  $EXTENSIONS ON$
00000000  1  $LIB_ABS_LONG$
00000000  1  $WARN OFF$
00000000  1
00000000  1  TYPE
00000000  1      INT = SIGNED_16;
00000000  1      INT_PTR = ^ INT;
00000000  1      PTR = ^ INTEGER;
00000000  1      VECTOR0_7 = ARRAY[0..7] OF INT;
00000000  1      DOUBLE_WORD = RECORD
00000000  2                  LSW : INT;
00000000  2                  MSW : INT;
00000000  1                  END;
00000000  1      COMPLEX_TYPE = RECORD
00000000  2                  VALUE : DOUBLE_WORD;
00000000  2                  MASK : DOUBLE_WORD;
00000000  1                  END;
00000000  1  #INCLUDE ICMD_DATA:SODAMON
00000000  1  #INCLUDE IDATA_BASE:SODAMON
00000000  1  #INCLUDE ISPEC_DATA:SODAMON
00000000  1
00000000  1  VAR
00000000  1  $EXTVAR+$
00000000  1      SEMANTIC_ERROR : INT;
00000000  1  $EXTVAR-$
00000000  1
00000000  1  $CALL_ABS_LONG ON$
00000000  1  PROCEDURE OUTIT(L:CHAR;V:INT;B:CHAR); EXTERNAL;
00000000  1  $CALL_PC_SHORT ON$
00000000  1  PROCEDURE SYMBOL_MESSAGE(MESS_NUM : INT; VAR IDENT : VECTOR0_7; MESSAGE : MESSAGE_TYPES); EXTERNAL;
00000000  1  PROCEDURE GENERAL_MESSAGE(MESS_NUM : INT; MESSAGE_CODE : MESSAGE_TYPES); EXTERNAL;
00000000  1  PROCEDURE FILE_MESSAGE(MESS_NUM : INT; FILE_NAME : VECTOR0_7; FILE_DISC : INT;
00000000  2                          MESSAGE_CODE : MESSAGE_TYPES); EXTERNAL;
00000000  1
00000000  1  PROCEDURE PASS_BY_NAME(VAR STACK : CMD_DATA_ARRAY);
00000000  2  VAR
00000000  2      INDEX : INT;
00000002  2      GEN : GENERIC_PTR;
00000004  2  BEGIN
00000004  2  INDEX := 0;
00000008  2  WHILE (STACK[INDEX].OP_CODE <> EOL) DO
00000020  2      BEGIN
00000020  2      IF STACK[INDEX].OP_CODE = VAR_OP THEN
00000034  2          BEGIN
00000034  2          GEN.GENERIC := STACK[INDEX].DB_PTR;
00000046  2          IF GEN.VARIABLE^.REC_TYPE = 6 THEN
00000056  2              IF SHIFT(SHIFT(GEN.VARIABLE^.FLAGS,+11),-15) = 1 THEN
0000006E  2                  SYMBOL_MESSAGE(22,GEN.VARIABLE^.NAME,Error);
00000080  2          END;
00000080  2      INDEX := INDEX + 1;
00000081  2      END;
00000086  2  END;
00000000  1
00000000  1  PROCEDURE MAIN_PROGRAM(VAR STACK : CMD_DATA_ARRAY);
00000000  2  VAR
00000000  2      INDEX : INT;
0000008E  2  BEGIN
0000008E  2  INDEX := 0;
```

```
00000092  2  WHILE (STACK[INDEX].OP_CODE <> EOL) DO
000000AA  2      BEGIN
000000AA  2      IF STACK[INDEX].OP_CODE = PARENTS THEN
000000BE  2          BEGIN
000000BE  2          INDEX := INDEX + 1;
000000C2  2          IF STACK[INDEX].PROC_NUM = 0 THEN
000000D6  2              SYMBOL_MESSAGE(25,STACK[INDEX].PROC_NAME,Error);
000000F4  2          END;
000000F4  2      INDEX := INDEX + 1;
000000F8  2      END;
000000FA  2  END;
00000000  1
00000000  1  PROCEDURE DUPLICATE_FILE(VAR STACK : CMD_DATA_ARRAY);
00000000  2  VAR
00000000  2      INDEX_1 : INT;
00000002  2      INDEX_2 : INT;
00000004  2      PROG_NUM : INT;
00000102  2  BEGIN
00000102  2  INDEX_1 := 0;
00000106  2  WHILE (STACK[INDEX_1].OP_CODE <> EOL) DO
0000011E  2      BEGIN
0000011E  2      IF STACK[INDEX_1].OP_CODE = FILE_OP THEN
00000132  2          BEGIN
00000132  2          PROG_NUM := STACK[INDEX_1].FILE_NUM;
00000144  2          INDEX_2 := INDEX_1 + 1;
0000014E  2          WHILE (STACK[INDEX_2].OP_CODE <> EOL) DO
00000166  2              BEGIN
00000166  2              IF STACK[INDEX_2].OP_CODE = FILE_OP THEN
0000017A  2                  IF PROG_NUM = STACK[INDEX_2].FILE_NUM THEN
00000192  2                      FILE_MESSAGE(63,STACK[INDEX_2].FILE_NAME,STACK[INDEX_2].DISC_NUM,Error);
000001C4  2              INDEX_2 := INDEX_2 + 1;
000001C8  2              END;
000001CA  2          END;
000001CA  2      INDEX_1 := INDEX_1 + 1;
000001CE  2      END;
000001D2  2  END;
00000000  1
00000000  1  PROCEDURE DUPLICATE_PROC(VAR STACK : CMD_DATA_ARRAY);
00000000  2  VAR
00000000  2      INDEX_1 : INT;
00000002  2      INDEX_2 : INT;
00000004  2      PROC_NUM : INT;
00000006  2      PROG_NUM : INT;
000001DA  2  BEGIN
000001DA  2  INDEX_1 := 0;
000001DE  2  WHILE (STACK[INDEX_1].OP_CODE <> EOL) DO
000001F6  2      BEGIN
000001F6  2      IF STACK[INDEX_1].OP_CODE = PARENTS THEN
0000020A  2          BEGIN
0000020A  2          INDEX_1 := INDEX_1 + 1;
0000020E  2          PROC_NUM := STACK[INDEX_1].PROC_NUM;
00000220  2          PROG_NUM := STACK[INDEX_1].FILE_NUM;
00000232  2          INDEX_2 := INDEX_1 + 1;
0000023C  2          WHILE (STACK[INDEX_2].OP_CODE <> EOL) DO
00000254  2              BEGIN
00000254  2              IF STACK[INDEX_2].OP_CODE = PARENTS THEN
00000268  2                  BEGIN
00000268  2                  INDEX_2 := INDEX_2 + 1;
0000026C  2                  IF (PROC_NUM = STACK[INDEX_2].PROC_NUM) AND
0000026C  2                     (PROG_NUM = STACK[INDEX_2].FILE_NUM) THEN
00000286  2                      SYMBOL_MESSAGE(26,STACK[INDEX_2].PROC_NAME,Error);
000002C4  2                  END;
000002C4  2              INDEX_2 := INDEX_2 + 1;
000002C8  2              END;
000002CC  2          END;
000002CC  2      INDEX_1 := INDEX_1 + 1;
000002D0  2      END;
000002D4  2  END;
00000000  1
00000000  1  PROCEDURE LOCAL_VARIABLES(VAR STACK : CMD_DATA_ARRAY);
00000000  2  VAR
00000000  2      INDEX_1 : INT;
00000002  2      INDEX_2 : INT;
00000004  2      PROC_NUM : INT;
```

```
00000006  2      PROG_NUM : INT;
00000008  2      GEN : GENERIC_PTR;
000002DC  2  BEGIN
000002DC  2  INDEX_1 := 0;
000002E0  2  WHILE (STACK[INDEX_1].OP_CODE <> EOL) DO
000002F8  2      BEGIN
000002F8  2      IF STACK[INDEX_1].OP_CODE = PARENTS THEN
0000030C  2           BEGIN
0000030C  2           INDEX_1 := INDEX_1 + 1;
00000310  2           PROC_NUM := STACK[INDEX_1].PROC_NUM;
00000322  2           PROG_NUM := STACK[INDEX_1].FILE_NUM;
00000334  2           INDEX_2 := INDEX_1 + 1;
0000033E  2           WHILE (STACK[INDEX_2].OP_CODE = VAR_OP) OR
0000033E  2                 (STACK[INDEX_2].OP_CODE = OFFSET) DO
00000374  2                BEGIN
00000374  2                IF STACK[INDEX_2].OP_CODE = VAR_OP THEN
00000388  2                     IF (PROC_NUM = STACK[INDEX_2].PROC_NUM) AND
00000388  2                        (PROG_NUM = STACK[INDEX_2].FILE_NUM) THEN
000003C2  2                          BEGIN
000003C2  2                          GEN.GENERIC := STACK[INDEX_2].DB_PTR;
000003D4  2                          IF GEN.VARIABLE^.REC_TYPE = 2 THEN
000003E4  2                               SYMBOL_MESSAGE(27,GEN.VARIABLE^.NAME,Error);
000003F6  2                          END;
000003F6  2                INDEX_2 := INDEX_2 + 1;
000003FA  2                END;
000003FE  2           END;
000003FE  2      INDEX_1 := INDEX_1 + 1;
00000402  2      END;
00000406  2  END;
00000000  1
00000000  1  PROCEDURE PASS_BY_VALUE_ON_EXIT(VAR STACK : CMD_DATA_ARRAY);
00000000  2  VAR
00000000  2      INDEX_1 : INT;
00000002  2      INDEX_2 : INT;
00000004  2      PROC_NUM : INT;
00000006  2      PROG_NUM : INT;
00000008  2      GEN : GENERIC_PTR;
0000040E  2  BEGIN
0000040E  2  INDEX_1 := 0;
00000412  2  WHILE (STACK[INDEX_1].OP_CODE <> EOL) DO
0000042A  2      BEGIN
0000042A  2      IF STACK[INDEX_1].OP_CODE = PARENTS THEN
0000043E  2           BEGIN
0000043E  2           INDEX_1 := INDEX_1 + 1;
00000442  2           PROC_NUM := STACK[INDEX_1].PROC_NUM;
00000454  2           PROG_NUM := STACK[INDEX_1].FILE_NUM;
00000466  2           INDEX_2 := INDEX_1 + 1;
00000470  2           IF SHIFT(SHIFT(STACK[INDEX_1].STATUS,+14),-15) = 1 THEN
00000494  2                WHILE (STACK[INDEX_2].OP_CODE = VAR_OP) OR
00000494  2                      (STACK[INDEX_2].OP_CODE = OFFSET) DO
000004CA  2                     BEGIN
000004CA  2                     IF STACK[INDEX_2].OP_CODE = VAR_OP THEN
000004DE  2                          IF (PROC_NUM = STACK[INDEX_2].PROC_NUM) AND
000004DE  2                             (PROG_NUM = STACK[INDEX_2].FILE_NUM) THEN
00000518  2                               BEGIN
00000518  2                               GEN.GENERIC := STACK[INDEX_2].DB_PTR;
0000052A  2                               IF GEN.VARIABLE^.REC_TYPE = 6 THEN
0000053A  2                                    IF SHIFT(SHIFT(GEN.VARIABLE^.FLAGS,+11),-15) = 0 THEN
00000550  2                                         GENERAL_MESSAGE(24,Warning);
0000055E  2                               END;
0000055E  2                     INDEX_2 := INDEX_2 + 1;
00000562  2                     END;
00000566  2                END;
00000566  2      INDEX_1 := INDEX_1 + 1;
0000056A  2      END;
0000056E  2  END.
00000000  1
00000000  1  PROCEDURE NON_ACTIVE_VARIABLES(VAR STACK : CMD_DATA_ARRAY);
00000000  2  VAR
00000000  2      INDEX_1 : INT;
00000002  2      INDEX_2 : INT;
00000004  2      INDEX_3 : INT;
00000006  2      PROC_NUM : INT;
00000008  2      GEN : GENERIC_PTR;
0000000C  2      FOUND : BOOLEAN;
```

```
00000576  2  BEGIN
00000576  2  INDEX_1 := 0;
0000057A  2  WHILE (STACK[INDEX_1].OP_CODE <> EOL) DO
00000592  2      BEGIN
00000592  2      IF STACK[INDEX_1].OP_CODE = PARENTS THEN
000005A6  2          BEGIN
000005A6  2          INDEX_2 := INDEX_1 + 2;
000005B0  2          WHILE (STACK[INDEX_2].OP_CODE = VAR_OP) OR
000005B0  2                (STACK[INDEX_2].OP_CODE = OFFSET) DO
000005E6  2              BEGIN
000005E6  2              IF STACK[INDEX_2].OP_CODE = VAR_OP THEN
000005FA  2                  BEGIN
000005FA  2                  GEN.GENERIC := STACK[INDEX_2].DB_PTR;
0000060C  2                  IF SHIFT(SHIFT(GEN.VARIABLE^.FLAGS,+12),-15) = 1 THEN
00000628  2                      IF STACK[INDEX_1+1].FILE_NUM <> STACK[INDEX_2].FILE_NUM THEN
0000064E  2                          SYMBOL_MESSAGE(33,GEN.VARIABLE^.NAME,Error)
00000664  2                      ELSE BEGIN
00000664  2                          PROC_NUM := STACK[INDEX_2].PROC_NUM;
0000067A  2                          FOUND := FALSE;
0000067E  2                          INDEX_3 := 0;
00000682  2                          WHILE (INDEX_3 < 15) AND (STACK[INDEX_1].PROC_NUMS[INDEX_3] <> -1) DO
000006BE  2                              BEGIN
000006BE  2                              IF STACK[INDEX_1].PROC_NUMS[INDEX_3] = PROC_NUM THEN
000006DC  2                                  FOUND := TRUE;
000006E2  2                              INDEX_3 := INDEX_3 + 1;
000006E6  2                              END;
000006E8  2                          IF NOT FOUND THEN
000006F0  2                              SYMBOL_MESSAGE(33,GEN.VARIABLE^.NAME,Error);
00000706  2                          END;
00000706  2                  END;
00000706  2              INDEX_2 := INDEX_2 + 1;
0000070A  2              END;
0000070E  2          INDEX_1 := INDEX_2;
00000714  2          END;
00000714  2      INDEX_1 := INDEX_1 + 1;
00000718  2      END;
0000071C  2  END;
00000000  1
00000000  1  PROCEDURE TOO_BIG(VAR STACK : CMD_DATA_ARRAY);
00000000  2  VAR
00000000  2      INDEX_1 : INT;
00000002  2      INDEX_2 : INT;
00000724  2  BEGIN
00000724  2  INDEX_1 := 0;
00000728  2  WHILE (STACK[INDEX_1].OP_CODE <> EOL) DO
00000740  2      BEGIN
00000740  2      IF STACK[INDEX_1].OP_CODE = VAR_OP THEN
00000754  2          BEGIN
00000754  2          IF STACK[INDEX_1].SIZE > 4 THEN
0000076E  2              GENERAL_MESSAGE(44,Error);
0000077C  2          IF STACK[INDEX_1].SIZE = -1 THEN
0000079A  2              BEGIN
0000079A  2              INDEX_1 := INDEX_1 + 1;
0000079E  2              INDEX_2 := 0;
000007A2  2              WHILE STACK[INDEX_1].OFFSETS[INDEX_2] <> -1 DO
000007CA  2                  INDEX_2 := INDEX_2 + 1;
000007D0  2              IF STACK[INDEX_1].SIZES[INDEX_2 - 1] > 4 THEN
000007FA  2                  GENERAL_MESSAGE(44,Error);
00000808  2              END;
00000808  2          END;
00000808  2      INDEX_1 := INDEX_1 + 1;
0000080C  2      END;
00000810  2  END;
00000000  1
00000000  1  $GLOBPROC+$
00000000  1
00000000  1  PROCEDURE POST_PROC(VAR STACK : CMD_ARRAY_PTR; OP_CODE : OP_CODES);
00000818  2  BEGIN
00000818  2  CASE OP_CODE OF
00000822  2      TR_VAR ,
00000822  2      TR_ASN : BEGIN
00000822  2          PASS_BY_NAME(STACK^);
00000830  2          END;
00000834  2      TR_DAT : BEGIN
```

```
00000834  2             NON_ACTIVE_VARIABLES(STACK^);
00000842  2             PASS_BY_VALUE_ON_EXIT(STACK^);
00000850  2             LOCAL_VARIABLES(STACK^);
0000085E  2             DUPLICATE_PROC(STACK^);
0000086C  2             END;
00000870  2         TR_MOD : BEGIN
00000870  2             DUPLICATE_FILE(STACK^);
0000087E  2             DUPLICATE_PROC(STACK^);
0000088C  2             MAIN_PROGRAM(STACK^);
0000089A  2             END;
0000089E  2         MOD_VAR : BEGIN
0000089E  2             TOO_BIG(STACK^);
000008AC  2             END;
000008B0  2         OTHERWISE ; {no error trap}
000008B0  2         END;
000008BE  2  END;
00000000  1
00000000  1  .

End of compilation, number of errors=    0

00000000  1  "68000" PREPROCESS
00000000  1  $BASE_PAGES
00000000  1  $WIDTH 120$
00000000  1
00000000  1  PROGRAM SOURCE_;
00000000  1
00000000  1  $EXTENSIONS ON$
00000000  1  $LIB_ABS_LONG$
00000000  1  $WARN OFF$
00000000  1
00000000  1  TYPE
00000000  1      INT = SIGNED_16;
00000000  1      PTR = ^ INTEGER;
00000000  1      VECTOR0_7 = ARRAY[0..7] OF INT;
00000000  1      MESSAGE_TYPES = (Status,Warning,Error);
00000000  1  #INCLUDE IDISPLAY.SOBAMO
00000000  1
00000000  1  VAR
00000000  1  $EXTVAR+$
00000000  1      FILE_NAME : VECTOR0_7;
00000000  1      FILE_DISC : INT;
00000000  1      FILE_DCB : INT;
00000000  1      SOURCE_FILE : VECTOR0_7;
00000000  1      SOURCE_DISC : INT;
00000000  1      SOURCE_DCB : INT;
00000000  1      SOURCE_UP : INT;
00000000  1      SOURCE_BUFFER : BUFFER_ARRAY_TYPE;
00000000  1  $EXTVAR-$
00000000  1
00000000  1  $CALL_ABS_LONG ON$
00000000  1  PROCEDURE P_OPEN (VAR FNAME : VECTOR0_7; FTYPE, DISC : INT;
00000000  2                    VAR DCB : INT; BUFSIZE : INT;
00000000  2                    VAR FMGR_CODE : INT); EXTERNAL;
00000000  1  PROCEDURE P_FILE_ERR (VAR DCB : INT; FMGR_CODE : INT); EXTERNAL;
00000000  1  PROCEDURE P_READ (VAR DCB : INT; VAR RBUFF : SOURCE_LINE; LENGTH : INT;
00000000  2                    VAR FMGR_CODE : INT); EXTERNAL;
00000000  1  PROCEDURE P_READBACKWARD (VAR DCB : INT; VAR RBUFF : SOURCE_LINE; LENGTH : INT;
00000000  2                            VAR FMGR_CODE : INT); EXTERNAL;
00000000  1  PROCEDURE P_POSITION (VAR DCB : INT; RECN : INT;
00000000  2                     VAR FMGR_CODE : INT); EXTERNAL;
00000000  1  PROCEDURE P_CLOSE (VAR DCB : INT; VAR FMGR_CODE : INT); EXTERNAL;
00000000  1  PROCEDURE P_READRECNUM (VAR DCB, REC_NUM, FMGR_CODE : INT); EXTERNAL;
00000000  1  PROCEDURE OUTIT(L : CHAR; V : INT; B : CHAR); EXTERNAL;
00000000  1  PROCEDURE COPYBYTES(SOURCE, DEST : PTR; LENGTH : INT); EXTERNAL;
00000000  1  $CALL_PC_SHORT ON$
00000000  1  PROCEDURE ERASE_LINE(VAR DISPLAY : DISPLAY_TYPE); EXTERNAL;
00000000  1  PROCEDURE OUTPUT_LINE(VAR DISPLAY : DISPLAY_TYPE); EXTERNAL;
00000000  1  PROCEDURE OUTPUT_SCREEN(VAR DISPLAY : DISPLAY_TYPE); EXTERNAL;
00000000  1  PROCEDURE FMT_INTEGER(VAR DISPLAY : DISPLAY_TYPE; SOURCE : INTEGER;
00000000  2                         BASE : INT; LAST_COL : INT; SPACE : BOOLEAN); EXTERNAL;
00000000  1  PROCEDURE SYSTEM_MESSAGE(MESS_NUM, MESS_CODE : INT; MESSAGE : MESSAGE_TYPES); EXTERNAL;
00000000  1
00000000  1  $GLOBPROC+$
00000000  1
```

```
00000000  1  PROCEDURE SHOW_SOURCE(VAR DISPLAY : DISPLAY_TYPE);
00000000  2  LABEL 10;
00000000  2  VAR
00000000  2      FMGR_CODE : INT;
00000000  2
00000000  2  PROCEDURE DISPOSE_BUFFER;
00000000  3  VAR
00000000  3      I : INT;
00000004  3  BEGIN
00000004  3  FOR I := 1 TO SCREEN_SIZE DO
0000000A  3      BEGIN
0000000A  3      SOURCE_BUFFER[I].REC_NO := -1;
0000001E  3  {   IF SOURCE_BUFFER[I].LINE <> NIL THEN          (=================)
0000001E  3  {       DISPOSE(SOURCE_BUFFER[I].LINE);           (=================)
0000001E  3      END;
0000002E  3  END;
00000000  2
00000000  2  PROCEDURE FILL_BUFFER(POSITION : INT);
00000000  3  LABEL 1;
00000000  3  VAR
00000000  3      I : INT;
00000002  3      J : INT;
00000036  3  BEGIN
00000036  3  P_POSITION(SOURCE_DCB,POSITION + SCREEN_SIZE,FMGR_CODE);
00000058  3  IF FMGR_CODE <> 0 THEN
00000064  3      IF FMGR_CODE <> 1 THEN
00000070  3          GOTO 1  {error output at 1}
00000078  3      ELSE
00000078  3          BEGIN
00000078  3          P_READRECNUM(SOURCE_DCB,POSITION,FMGR_CODE);
00000094  3          DISPLAY.MAX_LINE := POSITION - 1;      {POSITION will be 1 to large}
000000A6  3          POSITION := POSITION - SCREEN_SIZE;
000000AC  3          IF POSITION < 1 THEN
000000B8  3              POSITION := 1;
000000BE  3          DISPLAY.HORIZONTAL := POSITION;
000000CC  3          END;
000000CC  3  P_POSITION(SOURCE_DCB,POSITION,FMGR_CODE);
000000E8  3  IF FMGR_CODE <> 0 THEN
000000F4  3      GOTO 1; {error output at 1}
000000F8  3  FOR I := 1 TO SCREEN_SIZE DO
000000FE  3      SOURCE_BUFFER[I].REC_NO := -1;
00000122  3  FOR I := 1 TO SCREEN_SIZE DO
00000128  3      BEGIN
00000128  3  {   NEW(SOURCE_BUFFER[I].LINE); (================================)
00000128  3      P_READ(SOURCE_DCB,SOURCE_BUFFER[I].LINE^,SOURCE_SIZE / 2,FMGR_CODE);
00000164  3      FOR J := INT(SOURCE_BUFFER[I].LINE^[-1]) * 2 TO SOURCE_SIZE DO
00000192  3          SOURCE_BUFFER[I].LINE^[J] := 20H;
000001C4  3      IF FMGR_CODE <> 0 THEN
000001D0  3          IF FMGR_CODE <> 1 THEN
000001DC  3              GOTO 1  {error outut at 1}
000001E4  3          ELSE BEGIN
000001E4  3              FMGR_CODE := 0;
000001EC  3              SOURCE_UP := 1;
000001F2  3              GOTO 1; {eof trapped}
000001F6  3              END;
000001F6  3      SOURCE_BUFFER[I].REC_NO := POSITION + I - 1;
00000212  3      ERASE_LINE(DISPLAY);
00000222  3      FMT_INTEGER(DISPLAY,SOURCE_BUFFER[I].REC_NO,10,LINE_SIZE,FALSE);
00000256  3      FOR J := 0 TO 5 DO
0000025A  3          SOURCE_BUFFER[I].LINE_NO[J] := DISPLAY.LINE^[J];
0000029A  3      END;
000002AC  3  SOURCE_UP := 1;
000002B2  3  1 :
000002B2  3  IF FMGR_CODE <> 0 THEN
000002BE  3      BEGIN
000002BE  3      P_FILE_ERR(SOURCE_DCB,FMGR_CODE);
000002CE  3      P_CLOSE(SOURCE_DCB,FMGR_CODE);
000002E2  3  {   DISPOSE_BUFFER;            (================================)
000002E2  3      SOURCE_UP := 0;
000002E6  3      END;
000002E6  3  END;
00000000  2
00000000  2  PROCEDURE GET_PREVIOUS_LINE;
```

```
00000000 3 LABEL 1;
00000000 3 VAR
00000000 3     I : INT;
00000002 3     TEMP : SOURCE_LINE_PTR;
000002EE 3 BEGIN
000002EE 3 P_POSITION(SOURCE_DCB,DISPLAY.HORIZONTAL,FMGR_CODE);
0000030E 3 IF FMGR_CODE <> 0 THEN
0000031A 3     BEGIN
0000031A 3     IF FMGR_CODE <> 1 THEN
00000326 3         P_FILE_ERR(SOURCE_DCB,FMGR_CODE);
00000334 3     GOTO 1; (error trapped)
00000338 3     END;
00000338 3 IF SOURCE_BUFFER[1].REC_NO <> DISPLAY.HORIZONTAL THEN
0000034C 3     BEGIN
0000034C 3     (IF SOURCE_BUFFER[SCREEN_SIZE].REC_NO <> -1 THEN(=================)
0000034C 3     (   DISPOSE(SOURCE_BUFFER[SCREEN_SIZE].LINE);    (=================)
0000034C 3     TEMP := SOURCE_BUFFER[SCREEN_SIZE].LINE;
00000356 3     FOR I := SCREEN_SIZE DOWNTO 2 DO
0000035C 3         SOURCE_BUFFER[I] := SOURCE_BUFFER[I - 1];
00000394 3     (NEW(SOURCE_BUFFER[1].LINE);    (================================)
00000394 3     SOURCE_BUFFER[1].LINE := TEMP;
0000039E 3     P_READ(SOURCE_DCB,SOURCE_BUFFER[1].LINE^,SOURCE_SIZE / 2,FMGR_CODE);
000003CC 3     FOR I := INT(SOURCE_BUFFER[1].LINE^[-1]) * 2 TO SOURCE_SIZE DO
000003EC 3         SOURCE_BUFFER[1].LINE^[I] := 20H;
00000410 3     IF FMGR_CODE <> 0 THEN
0000041C 3         IF FMGR_CODE <> 1 THEN
00000428 3             BEGIN
00000428 3             P_FILE_ERR(SOURCE_DCB,FMGR_CODE);
00000436 3             GOTO 1; (error trapped)
0000043A 3             END
0000043E 3         ELSE BEGIN
0000043E 3             FMGR_CODE := 0;
00000446 3             GOTO 1; (eof trapped)
0000044A 3             END;
0000044A 3     SOURCE_BUFFER[1].REC_NO := DISPLAY.HORIZONTAL;
00000458 3     ERASE_LINE(DISPLAY);
00000464 3     FMT_INTEGER(DISPLAY,SOURCE_BUFFER[1].REC_NO,10,LINE_SIZE,FALSE);
0000048A 3     FOR I := 0 TO 5 DO
0000049E 3         SOURCE_BUFFER[1].LINE_NO[I] := DISPLAY.LINE^[I];
000004C0 3     END;
000004C0 3 1:
000004C0 3 END;
00000000 2
00000000 2 PROCEDURE GET_NEXT_LINE;
00000000 3 LABEL 1;
00000000 3 VAR
00000000 3     I : INT;
00000002 3     TEMP : SOURCE_LINE_PTR;
000004C8 3 BEGIN
000004C8 3 P_POSITION(SOURCE_DCB,DISPLAY.HORIZONTAL + SCREEN_SIZE,FMGR_CODE);
000004EE 3 IF FMGR_CODE <> 0 THEN
000004FA 3     BEGIN
000004FA 3     IF FMGR_CODE <> 1 THEN
00000506 3         P_FILE_ERR(SOURCE_DCB,FMGR_CODE)
00000518 3     ELSE
00000518 3         BEGIN
00000518 3         DISPLAY.MAX_LINE := DISPLAY.HORIZONTAL + SCREEN_SIZE - 2;
0000052E 3         DISPLAY.HORIZONTAL := DISPLAY.HORIZONTAL - 1;
00000540 3         END;
00000540 3     GOTO 1; (error trapped)
00000544 3     END;
00000544 3 IF SOURCE_BUFFER[SCREEN_SIZE].REC_NO <> DISPLAY.HORIZONTAL + SCREEN_SIZE - 1 THEN
00000560 3     BEGIN
00000560 3     P_POSITION(SOURCE_DCB,DISPLAY.HORIZONTAL + SCREEN_SIZE - 1,FMGR_CODE);
00000580 3     (IF SOURCE_BUFFER[1].REC_NO <> -1 THEN          (=================)
00000580 3     (   DISPOSE(SOURCE_BUFFER[1].LINE);             (=================)
00000580 3     TEMP := SOURCE_BUFFER[1].LINE;
0000058A 3     FOR I := 2 TO SCREEN_SIZE DO
00000590 3         SOURCE_BUFFER[I - 1] := SOURCE_BUFFER[I];
000005C8 3     (NEW(SOURCE_BUFFER[SCREEN_SIZE].LINE);          (=================)
000005C8 3     SOURCE_BUFFER[SCREEN_SIZE].LINE := TEMP;
000005D2 3     P_READ(SOURCE_DCB,SOURCE_BUFFER[SCREEN_SIZE].LINE^,SOURCE_SIZE / 2,FMGR_CODE);
00000600 3     FOR I := INT(SOURCE_BUFFER[SCREEN_SIZE].LINE^[-1]) * 2 TO SOURCE_SIZE DO
00000620 3         SOURCE_BUFFER[SCREEN_SIZE].LINE^[I] := 20H;
00000644 3     IF FMGR_CODE <> 0 THEN
```

```
00000650  3          IF FMGR_CODE <> 1 THEN
0000065C  3              BEGIN
0000065C  3              P_FILE_ERR(SOURCE_DCB.FMGR_CODE);
0000066A  3              GOTO 1; {error trapped}
0000066E  3              END
00000672  3          ELSE BEGIN
00000672  3              FMGR_CODE := 0;
0000067A  3              GOTO 1; {eof trapped}
0000067E  3              END;
0000067E  3      SOURCE_BUFFER[SCREEN_SIZE].REC_NO := DISPLAY.HORIZONTAL + SCREEN_SIZE - 1;
00000694  3      ERASE_LINE(DISPLAY);
000006A0  3      FMT_INTEGER(DISPLAY,SOURCE_BUFFER[SCREEN_SIZE].REC_NO,10,LINE_SIZE,FALSE);
000006C6  3      FOR I := 0 TO 5 DO
000006CA  3          SOURCE_BUFFER[SCREEN_SIZE].LINE_NO[I] := DISPLAY.LINE^[I];
000006FC  3      END;
000006FC  3  1:
000006FC  3  END;
00000000  2
00000000  2  PROCEDURE MOVE_BUFFER_TO_SCREEN(INDENT : INT);
00000000  3  VAR
00000000  3      I : INT;
00000002  3      J : INT;
00000704  3  BEGIN
00000704  3  WITH DISPLAY DO BEGIN
00000710  3  FOR I := 1 TO SCREEN_SIZE DO
00000716  3      IF SOURCE_BUFFER[I].REC_NO > 0 THEN
0000072C  3          BEGIN
0000072C  3          ROW := SOURCE_BUFFER[I].REC_NO;
00000740  3          FOR J := 0 TO 5 DO
00000744  3              SCREEN^[I][J] := SOURCE_BUFFER[I].LINE_NO[J];
00000788  3          COPYBYTES(PTR(INTEGER(SOURCE_BUFFER[I].LINE) + 2 + INDENT),
00000788  3                    PTR(INTEGER(ADDR(SCREEN^[I])) + 6),LINE_SIZE - 5);
000007D6  3  {       END
000007D6  3      ELSE BEGIN
000007D6  3          FOR J := 0 TO LINE_SIZE DO
000007D6  3              SCREEN^[I][J] := 20H;              }
000007D6  3          END;
000007E6  3  ROW := ROW + 1;
000007F6  3  END;
000007F6  3  END;
000007FE  2
000007FE  2  BEGIN
000007FE  2  WITH DISPLAY DO BEGIN
00000806  2  CASE SOURCE_UP OF
00000810  2  (*  -1 : BEGIN              {new source}
00000810  2          P_CLOSE(SOURCE_DCB,FMGR_CODE);
00000810  2          DISPOSE_BUFFER;
00000810  2          P_OPEN (SOURCE_FILE,2,SOURCE_DISC,SOURCE_DCB,1,FMGR_CODE);
00000810  2          IF FMGR_CODE <> 0 THEN
00000810  2              BEGIN
00000810  2              P_FILE_ERR(SOURCE_DCB,FMGR_CODE);.
00000810  2              GOTO 10; {error trapped}
00000810  2              END;
00000810  2  {       DISPLAY.} VERTICAL := 0;
00000810  2  {       DISPLAY.} MAX_LINE := 32767;
00000810  2          FILL_BUFFER(HORIZONTAL);
00000810  2  {       HORIZONTAL := 1;        }
00000810  2          END;                                         *)
00000810  2      0 : BEGIN                   {un-initialized}
00000810  2          P_OPEN (SOURCE_FILE,2,SOURCE_DISC,SOURCE_DCB,1,FMGR_CODE);
00000834  2          IF FMGR_CODE <> 0 THEN
0000083C  2              BEGIN
0000083C  2              P_FILE_ERR(SOURCE_DCB,FMGR_CODE);
0000084C  2              GOTO 10; {error trapped}
00000850  2              END;
00000850  2          VERTICAL := 0;
00000858  2          MAX_LINE := 32767;
00000862  2          HORIZONTAL := 1;
0000086C  2          FILL_BUFFER(HORIZONTAL);
0000087E  2          END;
00000882  2      1 : BEGIN                   {source up}
00000882  2          CASE COMMAND OF
00000890  2              -8 : BEGIN {position}
00000890  2                  IF DISPLAY.POSITION > DISPLAY.MAX_LINE THEN
```

```
000008A0  2                    DISPLAY.POSITION := DISPLAY.MAX_LINE - 15;
000008AC  2                 IF DISPLAY.POSITION < 1 THEN
000008BC  2                    DISPLAY.POSITION := 1;
000008C2  2                 DISPLAY.HORIZONTAL := DISPLAY.POSITION;
000008CC  2                 DISPOSE_BUFFER;
000008D6  2                 FILL_BUFFER(DISPLAY.POSITION);
000008E8  2                 END;
000008EC  2              12 : BEGIN (next page)
000008EC  2                 DISPOSE_BUFFER;
000008F6  2                 FILL_BUFFER(HORIZONTAL);
00000908  2                 END;
0000090C  2              18 : BEGIN (previous page)
0000090C  2                 DISPOSE_BUFFER;
00000916  2                 FILL_BUFFER(HORIZONTAL);
00000928  2                 END;
0000092C  2              19 : BEGIN (roll down)
0000092C  2                 GET_PREVIOUS_LINE
00000936  2                 END;
0000093A  2              20 : BEGIN (roll up)
0000093A  2                 GET_NEXT_LINE
00000944  2                 END;
00000948  2              21 : BEGIN (shift right arrow)
00000948  2                 END;
0000094C  2              22 : BEGIN (shift left arrow)
0000094C  2                 END;
00000950  2              OTHERWISE ; (no error trap)
00000950  2              END;
00000952  2           END;
00000986  2        OTHERWISE SYSTEM_MESSAGE(1011,SOURCE_UP.Error);
00000998  2        END;
000009BA  2  IF SOURCE_UP = 1 THEN
000009C6  2        BEGIN
000009C6  2        MOVE_BUFFER_TO_SCREEN(VERTICAL);
000009D8  2        IF NOT COPY_FLAG THEN
000009E4  2           OUTPUT_SCREEN(DISPLAY);
000009F0  2        END;
000009F0  2  10 :
000009F0  2  END;
000009F0  2  END;
00000000  1  .
```

****WARNING ?? - Symbol: LABEL_1, is duplicated in the asmb_syn file.
****WARNING ?? - Symbol: LABEL_1, is duplicated in the asmb_syn file.

End of compilation. number of errors=    0

```
                       "68000"

                                EXTERNAL STACK_

  000000 00000000                DC.L  STACK_
                     *           DC.L  -1

                                END
```

Errors=    0

```
 00000000  1  "68000"
 00000000  1  $BASE_PAGES
 00000000  1  $WIDTH 120$
 00000000  1
 00000000  1  PROGRAM STACK_UTL_;
 00000000  1
 00000000  1  $EXTENSIONS ON$
 00000000  1  $LIB_ABS_LONG$
 00000000  1  $WARN OFF$
 00000000  1
 00000000  1  TYPE
 00000000  1     INT = SIGNED_16;
 00000000  1     DOUBLE_WORD = RECORD
 00000000  2                 MSW : INT;
 00000000  2                 LSW : INT;
 00000000  1                 END;
 00000000  1
 00000000  1  VAR
```

```
00000000  1  $EXTVAR+$
00000000  1  $VARS
00000000  1      SERR_TEXT : INTEGER;
00000000  1  $BASE_PAGES
00000000  1      TOKEN_STACK : ARRAY[0..9] OF DOUBLE_WORD;
00000000  1      TOKEN_PTR : INTEGER;
00000000  1  $EXTVAR-$
00000000  1
00000000  1  $CALL_ABS_LONG ON$
00000000  1  PROCEDURE P_MESSAGE(MESS_PTR : INTEGER; CODE : INT); EXTERNAL;
00000000  1  $CALL_PC_SHORT ON$
00000000  1
00000000  1  $GLOBPROC+$
00000000  1
00000000  1  PROCEDURE RESET_POINTERS;
00000004  2  BEGIN
00000004  2  TOKEN_PTR := -1;
0000000C  2  END;
00000000  1
00000000  1  PROCEDURE TOKEN_STACK_ERROR;
00000014  2  BEGIN
00000014  2  P_MESSAGE(INTEGER(ADDR(SERR_TEXT)),0E000H);
00000028  2  END;
00000000  1
00000000  1  PROCEDURE PUSH_DOUBLE(VALUE : DOUBLE_WORD);
00000030  2  BEGIN
00000030  2  IF TOKEN_PTR < 9 THEN
0000003E  2      BEGIN
0000003E  2      TOKEN_PTR := TOKEN_PTR + 1;
00000042  2      TOKEN_STACK[TOKEN_PTR].LSW := VALUE.LSW;
0000005A  2      TOKEN_STACK[TOKEN_PTR].MSW := VALUE.MSW;
0000006A  2      END
0000006E  2  ELSE
0000006E  2      TOKEN_STACK_ERROR;
00000070  2  END;
00000000  1
00000000  1  PROCEDURE POP_DOUBLE(VAR VALUE : DOUBLE_WORD);
00000078  2  BEGIN
00000078  2  IF TOKEN_PTR > -1 THEN
00000086  2      BEGIN
00000086  2      VALUE.LSW := TOKEN_STACK[TOKEN_PTR].LSW;
0000009A  2      VALUE.MSW := TOKEN_STACK[TOKEN_PTR].MSW;
000000AC  2      TOKEN_PTR := TOKEN_PTR - 1;
000000B0  2      END
000000B4  2  ELSE
000000B4  2      TOKEN_STACK_ERROR;
000000B8  2  END;
00000000  1
00000000  1  PROCEDURE PUSH_SINGLE(VALUE : INT);
000000C0  2  BEGIN
000000C0  2  IF TOKEN_PTR < 9 THEN
000000CE  2      BEGIN
000000CE  2      TOKEN_PTR := TOKEN_PTR + 1;
000000D2  2      TOKEN_STACK[TOKEN_PTR].LSW := VALUE;
000000E6  2      END
000000EA  2  ELSE
000000EA  2      TOKEN_STACK_ERROR;
000000EE  2  END;
00000000  1
00000000  1  PROCEDURE POP_SINGLE(VAR VALUE : INT);
000000F6  2  BEGIN
000000F6  2  IF TOKEN_PTR > -1 THEN
00000104  2      BEGIN
00000104  2      VALUE := TOKEN_STACK[TOKEN_PTR].LSW;
00000116  2      TOKEN_PTR := TOKEN_PTR - 1;
0000011A  2      END
0000011E  2  ELSE
0000011E  2      TOKEN_STACK_ERROR;
00000122  2  END;
00000000  1  .

End of compilation, number of errors=    0
```

```
                  "68000"

                               GLOBAL Zstartprogram
000000            Zstartprogram
                  *            MOVE.L #STACK_,A7
                  *            MOVE   #0,A5
                  *            MOVE   #0,A6
000000 4ED0                    JMP    [A0]
                               EXTERNAL STACK_

                               GLOBAL Zendprogram
000002 4EF9       Zendprogram  JMP    $

                  *PROCEDURE COPYBYTES (SOURCE, DESTINATION : BYTE_PTR; LENGTH : INT);
                               GLOBAL COPYBYTES
000008            COPYBYTES
000008 4E56 0000               LINK     A6,#0
00000C 302E 0008               MOVE.W   8[A6],D0
000010 206E 000A               MOVEA.L  10[A6],A0
000014 226E 000E               MOVEA.L  14[A6],A1
000018 0480                    SUB.L    #1,D0
00001E            COPYBYTES_L1
00001E 10D9                    MOVE.B   [A1]+,[A0]+
                  *            SUBQ.W   #1,D0
                  *            BGT      COPYBYTES_L1
000020 51C8 FFFC               DBRA     D0,COPYBYTES_L1
000024 4E5E                    UNLK     A6
000026 4E75                    RTS

                  *PROCEDURE COPYWORDS (SOURCE, DESTINATION : WORD_PTR; LENGTH : INT);
                               GLOBAL COPYWORDS
000028            COPYWORDS
000028 4E56 0000               LINK     A6,#0
00002C 302E 0008               MOVE.W   8[A6],D0
000030 206E 000A               MOVEA.L  10[A6],A0
000034 226E 000E               MOVEA.L  14[A6],A1
000038            COPYWORDS_L1
000038 30D9                    MOVE.W   [A1]+,[A0]+
00003A 5340                    SUBQ.W   #1,D0
00003C 6EFA                    BGT      COPYWORDS_L1
00003E 4E5E                    UNLK     A6
000040 4E75                    RTS

                               END

Errors=   0

00000000  1  "68000" PREPROCESS
00000000  1  $BASE_PAGES
00000000  1  $WIDTH 120$
00000000  1
00000000  1  PROGRAM SYMBOL_;
00000000  1
00000000  1  $EXTENSIONS ON$
00000000  1  $LIB_ABS_LONG$
00000000  1  $WARN OFF$
00000000  1
00000000  1  TYPE
00000000  1     INT = SIGNED_16;
00000000  1     PTR = ^ INTEGER;
00000000  1     WPTR = ^ INT;
00000000  1     BPTR = ^ BYTE;
00000000  1     VECTOR0_7 = ARRAY[0..7] OF INT;
00000000  1  {  BUFFER = ARRAY[-1..79] OF INT;
00000000  1     BUFFER_PTR = ^ BUFFER;
00000000  1     DOUBLE_WORD = RECORD
00000000  1                 MSW : INT;
00000000  1                 LSW : INT;
00000000  1                 END;
00000000  1     COMPLEX_TYPE = RECORD
00000000  1                 VALUE : DOUBLE_WORD;
00000000  1                 MASK : DOUBLE_WORD;
00000000  1                 END;                          }
00000000  1  #INCLUDE IDATA_BASE:SODAMON
00000000  1  #INCLUDE ICMD_DATA:SODAMON
```

```
00000000 1  #INCLUDE ISPEC_DATA:SODAMON
00000000 1  #INCLUDE IDISPLAY:SODAMO
00000000 1
00000000 1  VAR
00000000 1  $EXTVAR+$
00000000 1  $FARS
00000000 1  $BASE_PAGES
00000000 1     SPEC_STACK : SPECABLE_ARRAY_PTR;
00000000 1  $EXTVAR-$
00000000 1     TEMP_PTR : WPTR;
00000004 1
00000004 1  $CALL_ABS_LONG ON$
00000000 1  PROCEDURE OUTIT(L :  CHAR; V : INT; B : CHAR); EXTERNAL;
00000000 1  PROCEDURE OUTPUT_SCREEN(VAR DISPLAY : DISPLAY_TYPE); EXTERNAL;
00000000 1  PROCEDURE OUTPUT_LINE(VAR DISPLAY : DISPLAY_TYPE); EXTERNAL;
00000000 1  PROCEDURE FORMAT (SIGNED:BOOLEAN; SOURCE:BPTR; SOURCESIZE:INT;
00000000 2                  DEST:PTR; VAR DESTSIZE:INT; BASE:INT; JUSTIFY:INT); EXTERNAL;
00000000 1  PROCEDURE ERASE_LINE(VAR DISPLAY : DISPLAY_TYPE); EXTERNAL;
00000000 1  PROCEDURE FMT_INTEGER(VAR DISPLAY : DISPLAY_TYPE; SOURCE : INTEGER;
00000000 2                       BASE : INT; LAST_COL : INT; SPACE : BOOLEAN); EXTERNAL;
00000000 1  PROCEDURE FMT_KEYWORD(VAR DISPLAY : DISPLAY_TYPE;
00000000 2                       WORD_PTR : WPTR; LAST_COL : INT; SPACE : BOOLEAN); EXTERNAL;
00000000 1  PROCEDURE FMT_IDENT(VAR DISPLAY : DISPLAY_TYPE;
00000000 2                     VAR IDENT : VECTOR0_7; LAST_COL : INT; SPACE : BOOLEAN); EXTERNAL;
00000000 1  PROCEDURE FMT_FILE(VAR DISPLAY : DISPLAY_TYPE;
00000000 2                    VAR NAME : VECTOR0_7; DISC : INT); EXTERNAL;
00000000 1  FUNCTION GET_PATH(TEMP_PTR : SPECABLE_TYPE_PTR; VAR SYM_DESC : SYM_DESC_TYPE) : BOOLEAN; EXTERNAL;
00000000 1  PROCEDURE FIND_SYM(PPTR : PATH_PTR; SPTR : PTR; VAR SYMTYPE : SYMSET;
00000000 2                   VAR LENGTH, ERROR : INT); EXTERNAL;
00000000 1  FUNCTION  DO_ERROR(ERROR : INT) : BOOLEAN; EXTERNAL;
00000000 1  PROCEDURE SYMBOL_MESSAGE(MESS_NUM : INT; VAR IDENT : VECTOR0_7; MESSAGE : MESSAGE_TYPES); EXTERNAL;
00000004 1  $CALL_PC_SHORT ON$
00000000 1  PROCEDURE SYSTEM_MESSAGE(MESS_NUM, MESS_CODE : INT; MESSAGE : MESSAGE_TYPES); EXTERNAL;
00000000 1
00000000 1  $GLOBPROC+$
00000000 1
00000000 1  PROCEDURE FORMAT_SYMBOL(VAR DISPLAY : DISPLAY_TYPE);
00000000 2  LABEL 1;
00000000 2  TYPE
00000000 2     SUBNODE_TYPE = RECORD
00000000 3                 VALUE : INTEGER;
00000000 3                 IDENT : VECTOR0_7;
00000000 2                 END;
00000000 2  SUBNODE_PTR = ^ SUBNODE_TYPE;
00000000 2  VAR
00000000 2  $EXTVAR+$
00000000 2  $FAR$
00000000 2     pointer : PTR;
00000000 2     length : PTR;
00000000 2     value : PTR;
00000000 2     LEFT_BRACKET : PTR;
00000000 2     RIGHT_BRACKET : PTR;
00000000 2     LEFT_PAREN : PTR;
00000000 2     RIGHT_PAREN : PTR;
00000000 2     COLON : PTR;
00000000 2     MINUS : PTR;
00000000 2     EQUAL : PTR;
00000000 2     long : PTR;
00000000 2     real : PTR;
00000000 2     char : PTR;
00000000 2     integer : PTR;
00000000 2     record : PTR;
00000000 2  $BASE_PAGES
00000000 2  $EXTVAR-$
00000000 2     SYM_DATA : SYMBUFF_PTR;
00000004 2     STACK_PTR : SPECABLE_TYPE_PTR;
00000008 2     SYM_DESC : SYM_DESC_TYPE;
00000048 2     PATH : PATH_PTR;
0000004C 2     LENGTH : INT;
0000004E 2     ERROR : INT;
00000050 2     SAVE_COLUMN : INT;
00000052 2     MAX_PTR : SUBNODE_PTR;
00000056 2     TEMP : SUBNODE_PTR;
0000005A 2     SUB : GENERIC_PTR;
00000000 2
```

```
00000000  2  FUNCTION NEXT_REC(VAR THIS_PTR : INT) : GENERIC_PTR;
00000004  3  VAR
00000004  3      T1 : INTEGER;
00000004  3  BEGIN
00000004  3  T1 := INTEGER(ADDR(THIS_PTR));
0000000C  3  NEXT_REC := GENERIC_PTR(SHIFT(THIS_PTR,+1) + T1);
00000024  3  THIS_PTR := 0;
0000002A  3  END;
00000000  2
00000000  2  PROCEDURE FORMAT_DATABASE(GEN : GENERIC_PTR);
00000000  3  VAR
00000000  3      SAVE_PTR : INT;
00000036  3  BEGIN
00000036  3  TEMP_PTR := WPTR(GEN);
0000003C  3  IF TEMP_PTR^ <> 0 THEN          {Tom's undocumented sneeky}
00000046  3      WITH GEN DO BEGIN
0000004E  3          CASE PROC^.REC_TYPE OF
0000005C  3
0000005C  3            0:  BEGIN            {procedure}
0000005C  3  {               OUTIT('R',0,'D');               }
0000005C  3                END;
00000060  3
00000060  3            1:  BEGIN            {function}
00000060  3  {               OUTIT('R',1,'D');               }
00000060  3                END;
00000064  3
00000064  3            2:  BEGIN            {variable}
00000064  3  {               OUTIT('R',2,'D');               }
00000064  3                FMT_IDENT(DISPLAY,VARIABLE^.NAME,LINE_SIZE,TRUE);
0000008C  3                SAVE_PTR := VARIABLE^.TYPE_PTR;
00000098  3                FORMAT_DATABASE(NEXT_REC(VARIABLE^.TYPE_PTR)); {found the field, follow its type}
000000B2  3                VARIABLE^.TYPE_PTR := SAVE_PTR;
000000BE  3                END;
000000C2  3
000000C2  3            3:  BEGIN            {record field pointer}
000000C2  3  {               OUTIT('R',3,'D');               }
000000C2  3                OUTPUT_LINE(DISPLAY);
000000D4  3                DISPLAY.COLUMN := SAVE_COLUMN;
000000E2  3                FMT_IDENT(DISPLAY,REC_FIELD^.NAME,LINE_SIZE,TRUE);
0000010A  3                SAVE_PTR := REC_FIELD^.TYPE_PTR;
00000116  3                FORMAT_DATABASE(NEXT_REC(REC_FIELD^.TYPE_PTR)); {found the field, follow its type}
00000132  3                REC_FIELD^.TYPE_PTR := SAVE_PTR;
0000013E  3                SAVE_PTR := REC_FIELD^.NEXT_PTR;
0000014A  3                FORMAT_DATABASE(NEXT_REC(REC_FIELD^.NEXT_PTR)); {check the next field}
00000166  3                REC_FIELD^.NEXT_PTR := SAVE_PTR;
00000172  3                END;
00000176  3
00000176  3            4:  BEGIN            {immediate constant}
00000176  3  {               OUTIT('R',4,'D');               }
00000176  3                END;
0000017A  3
0000017A  3            5:  BEGIN            {string constant}
0000017A  3  {               OUTIT('R',5,'D');               }
0000017A  3                END;
0000017E  3
0000017E  3            6:  BEGIN            {paramater}
0000017E  3  {               OUTIT('R',6,'D');               }
0000017E  3                END;
00000182  3
00000182  3            7:  BEGIN            {scalar}
00000182  3  {               OUTIT('R',7,'D');               }
00000182  3                SAVE_COLUMN := SAVE_COLUMN + 5;
0000018A  3                MAX_PTR := SUBNODE_PTR(INTEGER(GEN) + GEN.SCALAR^.REC_SIZE * 2);
000001A0  3                TEMP := SUBNODE_PTR(ADDR(GEN.SCALAR^.SCALAR));
000001A6  3                WHILE TEMP <> MAX_PTR DO
000001B8  3                    BEGIN
000001B8  3                    IF (TEMP^.VALUE >= SUB.SUBRANGE^.MIN) AND (TEMP^.VALUE <= SUB.SUBRANGE^.MAX) THEN
000001E2  3                        BEGIN
000001E2  3                        OUTPUT_LINE(DISPLAY);
000001F0  3                        DISPLAY.COLUMN := SAVE_COLUMN;
000001FE  3                        FMT_IDENT(DISPLAY,TEMP^.IDENT,LINE_SIZE,TRUE);
00000224  3                        FMT_KEYWORD(DISPLAY,EQUAL,LINE_SIZE,TRUE);
00000248  3                        FMT_INTEGER(DISPLAY,TEMP^.VALUE,10,LINE_SIZE,TRUE);
00000270  3                        END;
```

```
00000270  3                TEMP := SUBNODE_PTR(INTEGER(TEMP) + SHIFT(SHIFT(TEMP^.IDENT[0],-13) + 1,+1) + 4);
00000294  3                END;
00000298  3             SAVE_COLUMN := SAVE_COLUMN - 5;
000002A0  3             END;
000002A4  3
000002A4  3          8:  BEGIN            {subrange}
000002A4  3  {          OUTIT('R',8,'D');                  }
000002A4  3             SUB := GEN;
000002AE  3             FMT_KEYWORD(DISPLAY,LEFT_PAREN,LINE_SIZE,FALSE);
000002D0  3             FMT_INTEGER(DISPLAY,SUBRANGE^.MIN,16,LINE_SIZE,FALSE);
000002FA  3             FMT_KEYWORD(DISPLAY,MINUS,LINE_SIZE,FALSE);
0000031C  3             FMT_INTEGER(DISPLAY,SUBRANGE^.MAX,16,LINE_SIZE,FALSE);
00000346  3             FMT_KEYWORD(DISPLAY,RIGHT_PAREN,LINE_SIZE,FALSE);
00000368  3             END;
0000036C  3
0000036C  3          9:  BEGIN        {pointer}
0000036C  3  {          OUTIT('R',9,'D');                  }
0000036C  3             FMT_KEYWORD(DISPLAY,pointer,LINE_SIZE,TRUE);
00000390  3             SAVE_PTR := POINTER^.TYPE_PTR;
0000039C  3             FORMAT_DATABASE(NEXT_REC(POINTER^.TYPE_PTR)); {follow its type}
000003B8  3             POINTER^.TYPE_PTR := SAVE_PTR;
000003C4  3             END;
000003C8  3
000003C8  3         10: BEGIN             {set}
000003C8  3  {          OUTIT('R',10,'D');                 }
000003C8  3             END;
000003CC  3
000003CC  3         11: BEGIN             {array}
000003CC  3  {          OUTIT('R',11,'D');                 }
000003CC  3             FMT_KEYWORD(DISPLAY,LEFT_BRACKET,LINE_SIZE,FALSE);
000003EE  3             FMT_INTEGER(DISPLAY,AN_ARRAY^.LOWER,10,LINE_SIZE,FALSE);
00000418  3             FMT_KEYWORD(DISPLAY,COLON,LINE_SIZE,FALSE);
0000043A  3             FMT_INTEGER(DISPLAY,AN_ARRAY^.UPPER,10,LINE_SIZE,FALSE);
00000464  3             FMT_KEYWORD(DISPLAY,RIGHT_BRACKET,LINE_SIZE,FALSE);
00000486  3             SAVE_PTR := AN_ARRAY^.INDEX_PTR;
00000492  3             FORMAT_DATABASE(NEXT_REC(AN_ARRAY^.INDEX_PTR)); {check the index}
000004AE  3             AN_ARRAY^.INDEX_PTR := SAVE_PTR;
000004BA  3             SAVE_PTR := AN_ARRAY^.TYPE_PTR;
000004C6  3             FORMAT_DATABASE(NEXT_REC(AN_ARRAY^.TYPE_PTR)); {follow its type}
000004E2  3             AN_ARRAY^.TYPE_PTR := SAVE_PTR;
000004EE  3             END;
000004F2  3
000004F2  3         12: BEGIN          {record}
000004F2  3  {          OUTIT('R',12,'D');                 }
000004F2  3             FMT_KEYWORD(DISPLAY,record,LINE_SIZE,TRUE);
00000516  3             SAVE_COLUMN := SAVE_COLUMN + 5;
0000051E  3             SAVE_PTR := A_RECORD^.FIELD_PTR;
0000052A  3             FORMAT_DATABASE(NEXT_REC(A_RECORD^.FIELD_PTR)); {check the fields}
00000546  3             A_RECORD^.FIELD_PTR := SAVE_PTR;
00000552  3             SAVE_COLUMN := SAVE_COLUMN - 5;
0000055A  3             END;
0000055E  3
0000055E  3         13: BEGIN           {tag field}
0000055E  3  {          OUTIT('R',13,'D');                 }
0000055E  3             SAVE_PTR := TAG^.VARIANT_PTR;
0000056A  3             FORMAT_DATABASE(NEXT_REC(TAG^.VARIANT_PTR)); {check the variant record}
00000586  3             TAG^.VARIANT_PTR := SAVE_PTR;
00000592  3             SAVE_PTR := TAG^.NEXT_PTR;
0000059E  3             FORMAT_DATABASE(NEXT_REC(TAG^.NEXT_PTR)); {check the next field}
000005BA  3             TAG^.NEXT_PTR := SAVE_PTR;
000005C6  3             END;
000005CA  3
000005CA  3         14: BEGIN           {record variant}
000005CA  3  {          OUTIT('R',14,'D');                 }
000005CA  3             SAVE_PTR := VARIANT^.FIELD_PTR;
000005D6  3             FORMAT_DATABASE(NEXT_REC(VARIANT^.FIELD_PTR)); {check the fields}
000005F2  3             VARIANT^.FIELD_PTR := SAVE_PTR;
000005FE  3             SAVE_PTR := VARIANT^.VARIANT_PTR;
0000060A  3             FORMAT_DATABASE(NEXT_REC(VARIANT^.VARIANT_PTR)); {check the next variant}
00000626  3             VARIANT^.VARIANT_PTR := SAVE_PTR;
00000632  3             END;
00000636  3
00000636  3         15: BEGIN           {external procedure}
00000636  3  {          OUTIT('R',15,'D');                 }
00000636  3             END;
```

```
0000063A  3
0000063A  3            16: BEGIN          {real}
0000063A  3  {             OUTIT('R',16,'D');           }
0000063A  3                IF REAL^.SIZE = 8 THEN
0000064C  3                    FMT_KEYWORD(DISPLAY,long,LINE_SIZE,TRUE);
00000670  3                FMT_KEYWORD(DISPLAY,real,LINE_SIZE,TRUE);
00000694  3                END;
00000698  3
00000698  3            17: BEGIN          {char}
00000698  3  {             OUTIT('R',17,'D');           }
00000698  3                FMT_KEYWORD(DISPLAY,char,LINE_SIZE,TRUE);
000006BC  3                END;
000006C0  3
000006C0  3            18: BEGIN          {integer}
000006C0  3  {             OUTIT('R',18,'D');           }
000006C0  3                FMT_KEYWORD(DISPLAY,integer,LINE_SIZE,TRUE);
000006E4  3                END;
000006E8  3
000006E8  3            19: BEGIN          {bit field}
000006E8  3  {             OUTIT('R',19,'D');           }
000006E8  3                END;
000006EC  3
000006EC  3            20: BEGIN          {function return value}
000006EC  3  {             OUTIT('R',20,'D');      ,    }
000006EC  3                END;
000006F0  3
000006F0  3            21: BEGIN          {file}
000006F0  3  {             OUTIT('R',21,'D');           }
000006F0  3                END;
000006F4  3
000006F4  3            OTHERWISE SYSTEM_MESSAGE(611,INT(PROC^.REC_TYPE),Error);
00000710  3
00000710  3            END;
0000075A  3        END;
0000075A  3  END;
00000762  2
00000762  2  BEGIN
00000762  2  WITH DISPLAY DO BEGIN
0000076A  2  STACK_PTR := SPECABLE_TYPE_PTR(SPEC_STACK);
00000770  2  NEW(SYM_DATA);
00000782  2  NEW(PATH);
00000794  2  SYM_DESC.SYMBOL_NAME := STACK_PTR^.IDENT;
000007A8  2  IF NOT GET_PATH(STACK_PTR,SYM_DESC) THEN
000007DC  2      GOTO 1;
000007C0  2  LENGTH := SYMBUFF_SIZE;
000007C6  2  PATH^.SYM := SYM_DESC.SYMBOL_NAME;
000007D6  2  PATH^.PROC_NUM := SYM_DESC.PROC_NUM;
000007E0  2  PATH^.PROG_NUM := SYM_DESC.FILE_NUM;
000007EA  2  FIND_SYM(PATH,PTR(SYM_DATA),SYM_DESC.SYMBOL_TYPE,LENGTH,ERROR),
0000080A  2      IF DB_ERROR(ERROR) THEN
0000081C  2          IF ERROR = 11 THEN
00000828  2              SYMBOL_MESSAGE(55,SYM_DESC.SYMBOL_NAME,Error)
00000840  2          ELSE IF ERROR = 12 THEN
0000084C  2              SYMBOL_MESSAGE(9,SYM_DESC.SYMBOL_NAME,Error)
00000864  2          ELSE BEGIN
00000864  2              SYSTEM_MESSAGE(231,ERROR,Error);
00000876  2              GOTO 1; {error trapped}
0000087A  2              END;
0000087A  2  ERASE_LINE(DISPLAY);
00000808  2  LINE^ := HEADER^;
0000089A  2  OUTPUT_LINE(DISPLAY);
000008A8  2  OUTPUT_LINE(DISPLAY);
000008B6  2  COLUMN := 0;
000008BE  2  SAVE_COLUMN := 0;
000008C2  2  FORMAT_DATABASE(GENERIC_PTR(SYM_DATA));
000008D0  2  OUTPUT_LINE(DISPLAY);
000008DE  2  IF NOT COPY_FLAG THEN
000008EA  2      OUTPUT_SCREEN(DISPLAY);
000008F8  2  MAX_LINE := ROW - 1;
00000906  2  1 :
00000906  2  DISPOSE(PATH);
00000918  2  DISPOSE(SYM_DATA);
0000092A  2  END;
```

```
326 00000920  2  END;.
327 00000000  1  .

End of compilation, number of errors=    0

                     "68000"

                     KEY_ARRAY        MACRO &WORD
                     L_&WORD          DC.W E&&WORD-L_&WORD-2
                                      ASCII "&WORD"
                     E&&WORD
                                      MEND

                     SYMBOL_ARRAY     MACRO &NAME,&SYMBOL
                     L_&NAME          DC.W E&&NAME-L_&NAME-2
                                      ASCII &SYMBOL
                     E&&NAME
                                      MEND

                     KEY_WORD         MACRO &WORD
                                      GLOBAL &WORD
                     &WORD            DC.L SK&WORD
                     SK&WORD          DC.W EK&WORD-SK&WORD-2
                                      ASCII "&WORD"
                     EK&WORD
                                      MEND

                     KEY_WORD_U       MACRO &WORD
                                      GLOBAL &WORD
                     &WORD            DC.L SU&WORD
                     SU&WORD          DC.W EU&WORD-SU&WORD-2
                                      ASCII " &WORD"
                     EU&WORD
                                      MEND

                     SYMBOL           MACRO &NAME,&SYMBOL
                                      GLOBAL &NAME
                     &NAME            DC.L SS&NAME
                     SS&NAME          DC.W ES&NAME-SS&NAME-2
                                      ASCII &SYMBOL
                     ES&NAME
                                      MEND

000000                                KEY_WORD real
00000A                                KEY_WORD long
000014                                KEY_WORD char
00001E                                KEY_WORD integer
00002B                                KEY_WORD record
000038                                SYMBOL RIGHT_PAREN,")"
00003F                                SYMBOL LEFT_PAREN,"("
000047                                SYMBOL MINUS,"-"

                                      END

Errors=    0
                     "68000"

                     MESSAGE          MACRO &TITLE,&TEXT
                                      GLOBAL &TITLE
                     &TITLE           DC.L  S_&TITLE
                     S_&TITLE         DC.W  (E_&TITLE-S_&TITLE-1)/2
                                      ASCII &TEXT
                     E_&TITLE         ASCII " "
                                      MEND

                     * MISCELLANEOUS GLOBALS


                                      GLOBAL printer_HP
000000 687072696E    printer_HP       ASC "hprinterHP      "                 'h' = 68 -> length

                                      GLOBAL LISTFILE_HEADER
000010 0010          LISTFILE_HEADER  DC.W 10H
000012 2020202020                     ASC "                                   "

```

```
                       * MESSAGES FOR USE THROUGHOUT THE SYSTEM

000032                                 MESSAGE SERR_TEXT,"Token Stack Error"

                       * SYMANTIC ERROR MESSAGES

                                       GLOBAL SYMT_ERRS

00004C 00000168        SYMT_ERRS       DC.L SYMT_ERR_00
000050 0000019A                        DC.L SYMT_ERR_01
000054 000001D4                        DC.L SYMT_ERR_02
000058 00000200                        DC.L SYMT_ERR_03
00005C 00000226                        DC.L SYMT_ERR_04
000060 00000250                        DC.L SYMT_ERR_05
000064 00000270                        DC.L SYMT_ERR_06
000068 00000296                        DC.L SYMT_ERR_07
00006C 000002B8                        DC.L SYMT_ERR_08
000070 000002F4                        DC.L SYMT_ERR_09
000074 00000320                        DC.L SYMT_ERR_10
000078 00000354                        DC.L SYMT_ERR_11
00007C 00000370                        DC.L SYMT_ERR_12
000080 000003C6                        DC.L SYMT_ERR_13
000084 0000040A                        DC.L SYMT_ERR_14
000088 00000422                        DC.L SYMT_ERR_15
00008C 0000044C                        DC.L SYMT_ERR_16
000090 00000482                        DC.L SYMT_ERR_17
000094 000004B8                        DC.L SYMT_ERR_18
000098 000004E5                        DC.L SYMT_ERR_19
00009C 00000504                        DC.L SYMT_ERR_20
0000A0 00000534                        DC.L SYMT_ERR_21
0000A4 00000552                        DC.L SYMT_ERR_22
0000A8 00000596                        DC.L SYMT_ERR_23
0000AC 000005D0                        DC.L SYMT_ERR_24
0000B0 00000616                        DC.L SYMT_ERR_25
0000B4 00000658                        DC.L SYMT_ERR_26
0000B8 00000692                        DC.L SYMT_ERR_27
0000BC 000006C6                        DC.L SYMT_ERR_28
0000C0 000006E8                        DC.L SYMT_ERR_29
0000C4 00000712                        DC.L SYMT_ERR_30
0000C8 00000748                        DC.L SYMT_ERR_31
0000CC 00000760                        DC.L SYMT_ERR_32
0000D0 000007AA                        DC.L SYMT_ERR_33
0000D4 000007F0                        DC.L SYMT_ERR_34
0000D8 00000836                        DC.L SYMT_ERR_35
0000DC 0000086C                        DC.L SYMT_ERR_36
0000E0 00000896                        DC.L SYMT_ERR_37
0000E4 000008B8                        DC.L SYMT_ERR_38
0000E8 000008FA                        DC.L SYMT_ERR_39
0000EC 00000912                        DC.L SYMT_ERR_40
0000F0 0000094E                        DC.L SYMT_ERR_41
0000F4 00000974                        DC.L SYMT_ERR_42
0000F8 000009B0                        DC.L SYMT_ERR_43
0000FC 000009D0                        DC.L SYMT_ERR_44
000100 00000A0C                        DC.L SYMT_ERR_45
000104 00000A26                        DC.L SYMT_ERR_46
000108 00000A4E                        DC.L SYMT_ERR_47
00010C 00000A8A                        DC.L SYMT_ERR_48
000110 00000ABE                        DC.L SYMT_ERR_49
000114 00000B00                        DC.L SYMT_ERR_50
000118 00000B10                        DC.L SYMT_ERR_51
00011C 00000B26                        DC.L SYMT_ERR_52
000120 00000B42                        DC.L SYMT_ERR_53
000124 00000B58                        DC.L SYMT_ERR_54
000128 00000B8C                        DC.L SYMT_ERR_55
00012C 00000BCA                        DC.L SYMT_ERR_56
000130 00000C00                        DC.L SYMT_ERR_57
000134 00000C32                        DC.L SYMT_ERR_58
000138 00000C54                        DC.L SYMT_ERR_59
00013C 00000C8C                        DC.L SYMT_ERR_60
000140 00000CD0                        DC.L SYMT_ERR_61
000144 00000CFC                        DC.L SYMT_ERR_62
000148 00000D42                        DC.L SYMT_ERR_63
00014C 00000D89                        DC.L SYMT_ERR_64
000150 00000DCE                        DC.L SYMT_ERR_65
000154 00000DD8                        DC.L SYMT_ERR_66
```

```
000158 00000DE2                 DC.L SYNT_ERR_67
00015C 00000DEC                 DC.L SYNT_ERR_68 ,
000160 00000DF6                 DC.L SYNT_ERR_69
000164 00000E00                 DC.L SYNT_ERR_70

                 *          ***************************************************************
000168           MESSAGE SYNT_ERR_00,"Monitor System Error: 123456, Code: 123456"
00019A           MESSAGE SYNT_ERR_01,"File not found  file=                :comp_db"
0001B3           MESSAGE SYNT_ERR_02,"Duplicate module names in this file"
0001FF           MESSAGE SYNT_ERR_03,"Measurement data not available"
000226           MESSAGE SYNT_ERR_04,"Module not found:  123456789.12345"
000250           MESSAGE SYNT_ERR_05,"File is write protected"
00026F           MESSAGE SYNT_ERR_06,"File exists, wrong module type"
000296           MESSAGE SYNT_ERR_07,"Too many symbols specified"
0002B8           MESSAGE SYNT_ERR_08,"Counter mode may not be changed for this measurement"
0002F4           MESSAGE SYNT_ERR_09,"Variable not found:  123456789.12345"
000320           MESSAGE SYNT_ERR_10,"Undefined size for variable: 123456789.12345"
000354           MESSAGE SYNT_ERR_11,"Sub-element not found for variable:  123456789.12345"
000390           MESSAGE SYNT_ERR_12,"Variable expression has too many indirections"
0003C5           MESSAGE SYNT_ERR_13,"Specify run at_execution from emulator for IMB measurements"
000409           MESSAGE SYNT_ERR_14,"No path defined"
000427           MESSAGE SYNT_ERR_15,"Invalid field for this measurement"
00044C           MESSAGE SYNT_ERR_16,"No transfer address - absolute file not loaded"
000482           MESSAGE SYNT_ERR_17,"No code generated for module:  123456789.12345"
0004B0           MESSAGE SYNT_ERR_18,"Setup specification overflow, simplify request"
0004EE           MESSAGE SYNT_ERR_19,"Bad line range"
000504           MESSAGE SYNT_ERR_20,"Line numbers are not in the same module"
000533           MESSAGE SYNT_ERR_21,"Line not found:  12345"
000552           MESSAGE SYNT_ERR_22,"Illegal to trace pass-by-reference variable: 123456789.12345"
000596           MESSAGE SYNT_ERR_23,"Showing source file:                          "
0005CF           MESSAGE SYNT_ERR_24,"Warning: value parameters will not be displayed on module exit"
000616           MESSAGE SYNT_ERR_25,"Main program illegal for this measurement: 123456789.12345"
000658           MESSAGE SYNT_ERR_26,"Duplicate module names specified:  123456789.12345"
000692           MESSAGE SYNT_ERR_27,"Local variables not allowed: 123456789.12345"
0006C6           MESSAGE SYNT_ERR_28,"Line range must be <= 255"
0006E7           MESSAGE SYNT_ERR_29,"Address range must be <= 4K bytes"
000711           MESSAGE SYNT_ERR_30,"Searching database for module: 123456789.12345"
000748           MESSAGE SYNT_ERR_31,"Searching database for variable: 123456789.12345"
000780           MESSAGE SYNT_ERR_32,"Searching database for line: 12345"
0007AA           MESSAGE SYNT_ERR_33,"Variable access not allowed at procedure for:  123456789.12345"
0007F0           MESSAGE SYNT_ERR_34,"More than 255 procedures in file:                      "
000836           MESSAGE SYNT_ERR_35,"Total field width greater than 220 characters"
00086D           MESSAGE SYNT_ERR_36,"Only nine fields may be displayed"
000895           MESSAGE SYNT_ERR_37,"Database search successful"
0008B8           MESSAGE SYNT_ERR_38,"Searching database for file:                      "
0008F9           MESSAGE SYNT_ERR_39,"No file defined"
000911           MESSAGE SYNT_ERR_40,"Warning: multiple drivers defined on trigger enable"
00094D           MESSAGE SYNT_ERR_41,"Analyzer not in real time mode"
000974           MESSAGE SYNT_ERR_42,"IMB drive/receive specifications must be turned off"
0009AF           MESSAGE SYNT_ERR_43,"No absolute file defined"
0009D0           MESSAGE SYNT_ERR_44,"Symbol is too big, modify sub-elements individually"
000A0B           MESSAGE SYNT_ERR_45,"No monitor program"
000A26           MESSAGE SYNT_ERR_46,"Invalid symbol type encountered"
000A4D           MESSAGE SYNT_ERR_47,"Warning: run at_execution may cause emulation break"
000A89           MESSAGE SYNT_ERR_48,"Variable access not allowed from current PC"
000ABD           MESSAGE SYNT_ERR_49,"No matching enable/disable defined, trigger_enable ignored"
000B00           MESSAGE SYNT_ERR_50,"Copying"
000B0F           MESSAGE SYNT_ERR_51,"Copy complete"
000B25           MESSAGE SYNT_ERR_52,"Saving configuration"
000B42           MESSAGE SYNT_ERR_53,"Save complete"
000B57           MESSAGE SYNT_ERR_54,"Incorrect type for variable: 123456789.12345"
000B8C           MESSAGE SYNT_ERR_55,"Type information too big for variable: 123456789.12345"
000BCA           MESSAGE SYNT_ERR_56,"Unsupported type for variable: 123456789.12345"
000C00           MESSAGE SYNT_ERR_57,"Windows not allowed in real_time required"
000C31           MESSAGE SYNT_ERR_58,"Configuration file corrupt"
000C54           MESSAGE SYNT_ERR_59,"No modules in file:                      "
000C8C           MESSAGE SYNT_ERR_60,"Absolute does not contain file:                      "
000CB0           MESSAGE SYNT_ERR_61,"Hewlett-Packard 64340 revision: 1.01"
000CFC           MESSAGE SYNT_ERR_62,"Enable/disable on any_state should be used with trigger enable"
000D42           MESSAGE SYNT_ERR_63,"Duplicate all specified for file:                      "
000D8D           MESSAGE SYNT_ERR_64,"Warning: emulator reset, re-loading absolute may be necessary"
000DC2           MESSAGE SYNT_ERR_65,"65"
000DD9           MESSAGE SYNT_ERR_66,"66"
000DE2           MESSAGE SYNT_ERR_67,"67"
```

```
000DEC    MESSAGE SYMT_ERR_68,"68"
000DF6    MESSAGE SYMT_ERR_69,"69"
000E00    MESSAGE SYMT_ERR_70,"70"


          * SYSTEM MESSAGE NUMBERS:
          *
          * XX Y Z
          *-------
          *
          * 1     MISC_UTL
          * 1 1        ADD_TO_STACK ()
          * 1 1 1           -> unknown spec type OP_CODE
          * 1 2        DISPLAY_SOMETHING ()
          * 1 2 1           -> unknown display THIS_DISPLAY
          * 1 2 2           -> unknown signal SIGNAL
          *
          * 2     COMMAND
          * 2 1        BUILD_CMD_STACK ()
          * 2 1 1           -> unknown measurement ACTION
          * 2 1 2           -> SPEC_STACK is NIL
          * 2 2        GET_PATH ()
          * 2 2 1           -> error return PROC_NUM
          * 2 2 2           -> no path found, SPEC_END encountered
          * 2 3        FMT_SPEC ()
          * 2 3 1           -> error return FIND_SYM in SPEC_IDENT
          * 2 3 2           -> error return FIND_SYM in SPEC_MODULE
          * 2 3 3           -> error return PROC_NUM in SPEC_MODULE
          * 2 3 4           -> unknown operand STACK_PTR^.OPERAND
          * 2 3 5           -> unknown spec type STACK_PTR^.OP_CODE
          *
          * 3     PAS_UTL
          * 3 1
          * 3 1 1
          * 3 2        BUILD_VAR ()
          * 3 2 1           -> error return FIND_SYM
          * 3 3        BUILD_MOD ()
          * 3 3 1           -> error return LN_HANDLER for line 1
          * 3 3 2           -> error return FIND_LINE_NO for line 1
          * 3 3 3           -> error return while FIND_LINE_NO for line 1
          * 3 3 4           -> error return LN_HANDLER for line 2
          * 3 4        BUILD_LINE ()
          * 3 4 1           -> error return FIND_LINE_NO for line 1
          * 3 4 2           -> error return FIND_LINE_NO for line 2
          * 3 4 3           -> error return LINE_SUB for address 1
          * 3 4 4           -> error return LINE_SUB for address 2
          * 3 4 5           -> error return PROG_PNAME or SUB_NAME
          * 3 4 6           -> error return FIND_SYM
          * 3 5        BUILD_LINES ()
          * 3 5 1           -> error return FIND_LINE_NO
          * 3 6        BUILD_CONTEXT ()
          * 3 6 1           -> error return WHICH_FILE
          * 3 6 2           ->
          * 3 6 3           -> error return LINE_SUB
          * 3 6 4           -> error return PROG_PNAME or SUB_NAME
          * 3 6 5           -> error return FIND_SYM
          * 3 7        BUILD_PROCS ()
          * 3 7 1           -> error return SUB_NAME
          * 3 7 2           -> error return FIND_SYM
          * 3 7 3           -> error return FILE_RANGE
          *
          * 4     IMB
          * 4 1        MONITOR_IMB ()
          * 4 1 1           -> unknown command CDS.IMB_REQUEST
          * 4 1 2           -> STACK_AREA overflow
          * 4 1 3           -> IMB_STACK overflow
          * 4 2        FORK_DYNAMIC ()
          * 4 2 1           -> Process already exists
          * 4 3        FORK_STATIC ()
          * 4 3 1           -> Process already exists
          * 4 4        FORK_DISPLAY ()
          * 4 4 1           -> Process already exists
          *
          * 5     MODIFY
          * 5 1        FMT_SPEC ()
```

```
* 5 1 1            -> unknown spec type STACK_PTR^.OP_CODE
* 5 2          MODIFY_MEASUREMENT ()
* 5 2 1            -> unknown measurement MEASUREMENT_TYPE
*
* 6        DB_UTL
* 6 1          MATCH_VAR ()
* 6 1 1            -> unknown record type PROC^.REC_TYPE
* 6 2          BUILD_PARENTS ()
* 6 2 1            -> error return FIND_SYM
* 6 2 2            -> error return PARENT
*
* 7        DISPLAY
* 7 1          FMT_SPEC ()
* 7 1 1            -> unknown operand STACK_PTR^.OPERAND
* 7 1 2            -> unknown spec type STACK_PTR^.OP_CODE
* 7 2          SHOW_SETUP ()
* 7 2 1            -> unknown measurement MEASUREMENT_TYPE
*
* 8        MONITOR
* 8 1          main program ()
* 8 1 1            -> STACK_AREA overflow
* 8 1 2            -> IMB_STACK overflow
*
* 9        DEBUG
* 9 1          FORMAT_SPEC_STACK ()
* 9 1 1            -> unknown spec type STACK^.OP_CODE
*
* 10       SOURCE
* 10 1         SHOW_SOURCE ()
* 10 1 1           -> unknown command SOURCE_UP
*
* 11       APPLY_SM
* 11 1         APPLY_SM ()
* 11 1 1           -> no PROC_OP, LINE_OP, or VALUE_OP on run stack
*
* 12       COMMON
* 12 1         INITIALIZE ()
* 12 1 1           -> SEMANTIC_ERROR <> 0 AFTER SETUP
*

                 END

Errors=    0
```

```
LOCATION OBJECT CODE LINE     SOURCE LINE

                         "68000"

                                   GLOBAL EMULATION_ID

                                   DATA

 000000 00F2             EMULATION_ID   DC.W  00F2H

                                   END

Errors=    0
```

| FILE/PROG NAME | PROGRAM | DATA | COMMON | ABSOLUTE | DATE | TIME | COMMENTS |
|---|---|---|---|---|---|---|---|
| BUILD_EMT:SODAMO | 0063000 | | | | Sat, 26 Jan 1985, 12:44 | | |
| MONITOR:SODAMO | 0065004 | | | | Sat, 26 Jan 1985, 14:23 | | |
| SUPPORT:SODAMO | 0065292 | | | | Sat, 26 Jan 1985, 14:26 | | |
| COMMON:SODAMO | 00652D4 | 0004000 | | | Sat, 26 Jan 1985, 14:20 | | |
| TEXTS:SODAMO | 0065600 | | | | Sat, 26 Jan 1985, 14:39 | | |
| APPLY:SODAMO | 006660A | | | | Sat, 26 Jan 1985, 13:32 | | |
| APPLY_CM:SODAMO | 00666F2 | 0004A44 | | | Sat, 26 Jan 1985, 14:24 | | |
| APPLY_CL:SODAMO | 00680AC | 0004A6A | | | Sat, 26 Jan 1985, 13:41 | | |
| STACK_UTL:SODAMO | 006880E | | | | Sat, 26 Jan 1985, 14:35 | | |
| PAS_UTL:SODAMO | 0068934 | | | | Sat, 26 Jan 1985, 14:28 | | |
| DB_UTL:SODAMO | 0069E8A | | | | Sat, 26 Jan 1985, 13:52 | | |
| CMP_IDENT:SODAMO | 006A37E | | | | Sat, 26 Jan 1985, 13:44 | | |
| MON_UTL:SODAMO | 006A8C0 | | | | Sat, 26 Jan 1985, 14:24 | | |
| next address | 006B282 | 0004A86 | | | | | |
| FIELD_68K:SODAMO | | 0004A86 | | | Sat, 26 Jan 1985, 14:07 | | |
| DISPLAY:SODAMO | 006B282 | | | | Sat, 26 Jan 1985, 14:01 | | |

```
DISPLAYA:SODAMO        0065356              Sat, 26 Jan 1985, 14:06
IO_UTLS:SODAMO         006BE24    0004E70   Sat, 26 Jan 1985, 14:13
POST_PROC:SODAMO       006EC42              Sat, 26 Jan 1985, 14:32
FORMATTER:SS_DYN       006F524    0004E7E   Fri, 25 Jan 1985, 13:01
MISC_UTL:SODAMO        006F7C3    0004E92   Sat, 26 Jan 1985, 14:17
IMD:SODAMO             00701B2    0004EAA   Sat, 26 Jan 1985, 14:10
COMMAND:SODAMO         00709F0    0004ED4   Sat, 26 Jan 1985, 13:46
SOURCE:SODAMO          007133C              Sat, 26 Jan 1985, 14:24
MODIFY:SODAMO          0072530              Sat, 26 Jan 1985, 14:20
DEBUG:SODAMO           0073302              Sat, 26 Jan 1985, 12:56
DEBUGA:SODAMO          00740B4              Sat, 26 Jan 1985, 13:50
SYMBOL:SODAMO          0075020    0004F68   Sat, 26 Jan 1985, 14:37
SYMBOLA:SODAMO         00755CA              Sat, 26 Jan 1985, 14:39
EMUL_68K:SODAMO                   0004FAC   Sat, 26 Jan 1985, 15:24
next address           0075DAA    0004F6E

STACK_ADD:SODAMO       0001000              Sat, 26 Jan 1985, 14:35
next address           0001004

(DATA_BASE:SODAMO)     0077000              Fri, 25 Jan 1985, 19:50
next address           0077084

(MESSAGE:SODAMO)       0078000              Sat, 26 Jan 1985, 12:44
next address           00780D4

(SYSTEM:SS_OS)         007F000              Fri, 25 Jan 1985, 15:55
next address           007F06A

(DYNAMIC:SS_DYN)       0048000              Sat, 31 Mar 1984, 16:13
next address           004805C

Libraries
AS_LIB:LT8000
    ASImult:L68000     0075DAA              Fri, 16 Nov 1984, 9:09
next address           0075C00    0004FAE
XFER address= 006500,  Defined by MONITOR
# of passes through libraries= 1
Absolute & link_com file name=EMUL_68K:SODAMO
Total # of bytes loaded= 0011D70
```

We claim:

1. Apparatus for acquiring data concerning the execution of software in a target system under test, which comprises:

static event recognition means, comprising low-level event recognition detectors programmable to produce a first output signal upon the occurrence of a chosen pattern of signals received from the target system under test, and high-level event recognition detectors responsive to said first output signal programmable to produce a second output signal upon the occurrence of a chosen pattern of said first output signals;

dynamic event recognition means comprising dynamic event recognition detectors programmable to produce a third output signal upon occurrence of a chosen pattern of signals received from the target system under test which represent actuation of a dynamic variable, at least one of said dynamic detectors being reprogrammable during the execution of the target system software to produce a fourth output signal upon the occurrence of a chosen pattern of signals received from the target system which represent access to a dynamically activated variable, and a dynamic sequencer responsive to said third output signal, which reprograms said dynamic detector, said dynamic sequencer also being responsive to said fourth output signal to produce a fifth output signal;

acquiition memory which receives signals from the target system under test and stores selected signals; and a function generator responsive to said second output signals and to said fifth output signals to store data in said acquisition memory.

2. A method of acquiring data concerning the execution of software in a target system under test, which comprises:

monitoring the status, data and address signals on the target system bus;

programming low-level event detectors responsive to said target system bus signals to produce an output whenever the target system bus signals are equal to selected values or within a range of selected values;

programming high-level event detectors, responsive to the outputs of the low-level event detectors, to produce an output whenever a selected pattern of outputs from the low-level detectors occurs;

programming dynamic event detectors responsive to said target system bus signals to produce a first output whenever the target system bus signals are equal to selected values or within a range of selected values;

reprogramming the dynamic event detectors during the execution of the software under test to produce a second output whenever the target bus signals are equal to selected values or within a range of values determined by a sequencer in response to said first output from the dynamic event detectors and to signals on the target system bus;

enabling a function generator to respond to the output from the high level event detectors and to the second output from the dynamic event detector to produce at least one output;

storing the status, data and address signals on the target system bus in an acquisition memory in response to the output signal from the function generator.

* * * * *

BEST AVAILABLE COPY